US006007617A

United States Patent [19]

Tourangeau

[11] Patent Number: 6,007,617

[45] Date of Patent: Dec. 28, 1999

[54] SYSTEM OF COLORED MINERAL POWDERS AND ITS APPLICATION IN MODERN ARCHITECTURAL MATERIALS

[76] Inventor: Paulette Tourangeau, 25, avenue de l'Epée, apt. 11, Outremont, Qc, Canada, H2V 3S8

[21] Appl. No.: 08/722,437

[22] Filed: Oct. 8, 1996

[51] Int. Cl.[6] ..... C04B 14/04

[52] U.S. Cl. ..... 106/486; 106/400; 106/415

[58] Field of Search ..... 106/287.1, 400, 106/401, 415, 416, 419, 425, 433, 434, 435, 439, 440, 441, 450, 451, 452, 453, 454, 456, 457, 458, 459, 461, 464, 466, 467, 470, 486; 523/200

[56] References Cited

U.S. PATENT DOCUMENTS

| | | | |
|---|---|---|---|
| 3,936,188 | 2/1976 | Sawyer | 356/36 |
| 4,749,869 | 6/1988 | Fournier | 250/492.1 |
| 5,084,909 | 1/1992 | Pollak | 378/64 |
| 5,637,878 | 6/1997 | Herer et al. | 250/492.3 |

OTHER PUBLICATIONS

"Classification and Chemical Description of the Complex Inorganic Color Pigments" 3rd ed., Dry Color Manufacturer's Association, pp. 37–40, Dec. 1991.

"Pigments (Inorganic)", Kirk–Othmer Encyclopedia of Chemical Technology, 3rd ed., vol. 17, J. Wiley&Sons, NY, pp. 788, 789, 794–836, Dec. 1982.

*Primary Examiner*—Mark L. Bell
*Assistant Examiner*—Scott L. Hertzog

[57] ABSTRACT

Disclosed is a system of natural colors consisting of thousands of colored powders of mineral origin and of materials in or on which pigments have been applied and, afterwards, submitted to at least one thermal treatment and/or irradiation. These natural colors cover the totality of the visible spectrum and offer a great variety of tones, tints and reflections from white to black, including all the rainbow colors. The powders of this system are obtained by a combination of three mechanical, chemical, thermal and/or irradiation processes. They are particularly useful to color materials and, more especially those used in the construction and architectural fields.

6 Claims, No Drawings

SYSTEM OF COLORED MINERAL POWDERS AND ITS APPLICATION IN MODERN ARCHITECTURAL MATERIALS

FIELD OF THE INVENTION

The present invention relates to new colouring powders forming a system of natural colours, covering the totality of the visible spectrum and offering an enormous variety of tints, tones and reflections, from white to black while including all the rainbow colours.

The invention also relates to the preparation of these new powders.

The invention further relates to the use of these new powders as pigments to colour materials, notably those usable for decorative or ornamental purposes and, more precisely, those that can be used in the building and architectural areas.

In the description and the following claims, when we use the expression "colour system", we mean an ensemble of natural colours, organized in a manner which is logical, viz. according to the natural order of the rainbow colours, beginning with white and ending with black. This system includes colours occurring in a pure state (obtained without being mixed with any other powder) that may be said "flat", viz. they do not have any tint or show any reflection. It also includes colours in a pure state, which may have tones, tints and/or reflections. It further includes mixtures of two or more of these colours. From a practical standpoint, these colours occur in the form of powders directly usable as pigments, or of materials in or on which powders have been applied and, afterwards, submitted to one or more thermal treatment(s) and/or one or more irradiation(s).

HISTORY OF THE INVENTION

The present invention originates many years ago, with the intention of obtaining pigments of very specific colours, which could be used to prepare paints having corresponding colours, without having to mix any of these pigments together in order to obtain these colours. This research allowed her to conclude that although many natural minerals or industrial pigments are available in the nature and on the market, the range of colours that they provide does not cover, far from it, the whole visible spectrum. Thus, for example, there are practically no blue or green pigments available.

With the support of many universities and public organizations, the inventor worked extensively in order to create new pigments corresponding to the missing colours.

By systematically doing chemical tests, using more or less prolonged treatments with acids or other reagents and/or heat, and/or physical tests using more or less prolonged irradiations of certain minerals with X rays or gamma rays before or after their integration into the materials to be coloured, she discovered that it is possible to obtain powders or coloured materials of practically all tints, tones and textures, which together form an almost infinite range of natural colours.

A detailed list of all the powders and the coloured materials which were so prepared, is given in the annexed Table I. Hence, Table I forms an integral part of the present specification. In Table I, the powders and coloured materials are numbered from 1 to 10,104 and are classified according to their colours and their tonalities in the following order: white (including white, ivory and cream), lilac, violet, blue, green, yellow, orange, pink, red, beige, brown, grey and black.

For each powder or material, one may find the colour, the tone and the tint obtained; the identification number given to this powder or material; the name of the mineral used as starting material to obtain the coloured powder; its origin; the colour of this mineral as a rock and when grinded to a powder, before it is subjected to any treatment; the name of the metal(s), mineral(s) or compound(s) which were used eventually for the treatment; when the case arises, the name and the composition of the material on or in which the powder(s) was (were) applied; and, finally, the process used to obtain the given colour.

Some of the listed powders are "natural" products or result from the plain mixing of "natural" products. By "natural" products, we mean powders that did not undergo any treatment, apart from a mechanical grinding and a possible mixing with one or more other powders which have not been treated. Therefore, there are products that can be found in nature as such and are not "new", or products that are obtained by the plain mixing of products which are not new. All these products, which are not new are excluded from the scope of the present invention.

Other powders listed in Table I, are not natural products, but they are, however, existing products described in publications or available on the market. These other powders are also excluded from the scope of the present invention.

OBJECTS AND SUMMARY OF THE INVENTION

Therefore, a first object of the present invention is to provide new coloured powders that can be used as pigments. These powders are obtained by chemical, heat and/or physical (irradiation) treatment(s) carried out before or after their application. The powders which thus constitute the first object of the invention, are listed in Table I.

A second object of the invention is also to provide a colour system consisting of the ensemble of coloured powders usable as pigments and of the materials in or on which coloured powders have been applied and, afterwards, submitted to one or more heat treatment(s) and/or one or more irradiation(s). More precisely, the second object of the invention is to provide a system of colours consisting of powders usable as pigments and of materials pigmented and treated thermally and/or irradiated, whose colours extend on almost all the visible spectrum. This system consists of the ensemble of powders and materials of different colours listed in Table I.

A third object of the invention is to provide a method of using as a pigment each of the coloured powders of the system of colours mentioned hereinabove.

DETAILED DESCRIPTION OF THE INVENTION

As previously mentioned, an object of the invention is to provide a system of colours consisting of an ensemble of coloured powders of mineral origin, obtained par mechanical, heat, chemical and/or physical processes and the materials in or on which mineral powders have been applied and, afterwards, submitted to one or many heat treatment(s) and/or one or many irradiation(s). This system is particularly original in so far as the colours of the powders and the materials composing it cover almost all the visible spectrum and offset an almost infinity of tints, tones and reflections.

The nature of each powder of the system according to the invention and their method of preparation are fully defined in Table I, as it has already been explained hereinabove.

The powders of the colour system according to the invention are usable as pigments in many areas. Among their possible uses, the colouring of modern architectural materials is certainly the most interesting one due to the mineral origin of the powders.

In this connection, it is worth noting that the great majority of the pigments or colours used industrially are of a purely organic type and are generally obtained from products derived from petroleum. The few inorganic pigments, which are used industrially are essentially iron, chromium, cadmium, zinc, molybdenum and titanium oxides, which have been subjected to stabilization treatments, generally of thermal nature.

For example, the textile industry and the ink manufacturers use almost exclusively organic pigments or colours, especially, in the first case, because of their capacity of penetration into the fibers and, in the second case, because they can be mixed to thus obtain a superposition of colours. The paint manufacturing industry mainly uses inorganic pigments, because they resist better to light and to the passage of time. The plastic industry uses both of them. Nevertheless, it is a fact that organic pigments are those which have been the most explored during the last fifty years. In fact, organic colours, mostly petroleum derivatives, are being used in most fields. Consequently, the use of minerals as colours or pigments, remain almost unexplored still today mostly because of the poor choice of colours which they offer.

The present invention provides a remedy for this lack by offering a complete system of mineral colours usable in all areas, although preferably for the colouring of modern architectural materials.

The expression "modern architectural materials" include all the materials used in the three main planning areas, that is to say:

1) architecture as such, ViZ. the elements composing the structure of a building or its complementaries, such as for example the windows;
2) interior planning, ViZ. the covering of the interior walls of a building, its furniture, the wallpaper, the hangings, etc. . . . ; and
3) the exterior planning, such as, for example, the exterior covering of a building.

Among the materials which may be so coloured and used on a large scale to manufacture structural elements of buildings, one may mention concrete, resins, polymers and other plastic materials.

Among the materials which may be coloured and are related to interior or exterior planning, one may mention arborite, ink, paper paste, glass, ceramic, tissues or metallic coverings, especially those basically composed of aluminum, stainless steel, galvanized sheet, black sheet, copper, brass, etc. . . .

In accordance with the present invention, colouring tests of these materials with many of the powders listed in Table I were done. Some of these tests were done on the material which was already manufactured. Others were done on the material, during its manufacturing. These tests, many of which will be explained in detail hereinafter, have shown that many of the obtained powders are usable as mineral pigments onto and/or into architectural materials. This double use of a same pigment in and on a same material is evidently interesting on an economical standpoint.

If the use of the powders according to the invention as pigments for the colouring of the modern architectural materials is very interesting and promising, it is however worth mentioning that the present invention is not restricted solely to this use. Thus, the powders according to the invention may also be used as pigments in many other areas that are not directly related to the building planning field. For example, they could also be used for the colouring of the paints used to draw the lines on the highways. The powders according to the invention could also be used not only as pigments to obtain the desired colouring but also to obtain interesting mechanical characteristics, such as, for example a better resistance to the friction of the tires of the cars. Consequently, they could diminish the wearing out of the lines, thus reducing the need to frequently renew them. The powders according to the invention could further be used as pigments in plaster, rubber, linoleum, slate, make-up, mosaics for the floors, chalks (pastels and wax), colouring pencils, artistic paints, etc. . . .

As one may note, the coloured powders according to the invention allow for diversifying the use of many minerals or, still, revealing uses of minerals which did not yet have any. This ensemble of powders may also contribute to regenerate certain mining areas, like for example the one of asbestos which, when it is transformed into a pigment as is proposed in accordance with the invention, does not have any more the menacing aspect it has as a fiber which is said to be harmful dust for the lungs. One may also mention molybdenite, numerous mines of which have been abandoned in Quebec because its uses have become outdated. And still, one may mention that many other minerals have never been used so far as colours or for any other purpose.

Preparation of the Coloured Powders According to the Invention

As it may clearly be seen in Table I, the coloured powders according to the invention are obtained by processes known as such, which are used either alone or in combination.

These processes may be:

purely mechanical (grinding, mixing, . . . );

purely thermal (heating or calcination);

purely chemical (reaction with acids, ammonia or other reagents);

purely physical (irradiation with UV, IR, gamma rays, . . . );

or a combination of one or more of the processes mentioned above, in any order.

Mechanical Process

"Mechanical process", means the grinding, sifting and optional mixing of one or more powders.

The powders obtained by a purely mechanical process (plain grinding and optional mixing with one or many other powders) are listed in annexed Table II and are, on a practical standpoint, excluded from the appended claims.

As non-restrictive examples of the implementation of this process, one may refer to the description given in Table I of the products numbered 41, 138, 2463.3, 3215.3 or 6932.

Heat Process

The heat process used for the synthesis of many of the powders according to the invention, consists essentially in the heating or calcinating of a mineral or a mixture of minerals at a temperature which may reach up to 2300° F. for a period ranging from 30 minutes to 10 hours. This process transforms the colour or the quality of colour of the mineral (s) that is (are) treated. It multiplies the number of colours which may be obtained from a same mineral. It destroys the impurities in the mineral and increases its resistance to degradation caused by the microfauna or microflora possibly present in it. The source of heat may be a furnace, a direct flame such as a torch, a laser beam or any other heating means. This process may be applied to all minerals. It can be carried out in ambient air or in an inert atmosphere and its duration and temperature may be controlled.

From a practical standpoint, the mineral may be in a rock or powder state. It may also be either in a pure state or mixed with one or many other mineral(s) or metal(s). This mineral may be humidified and/or stirred before, during or after the treatment in order to vivify the colour and, sometimes, even to modify it. The cooling may be quick or slow. The process may also include alternate periods of heat treatment and cooling (see powders 783 and 4245-6 in Table I).

It is worth mentioning that variations in the modalities of the heat treatment will cause variations in the colour or the quality of colour. In fact, the number of these variations is infinite. However, a heat treatment which is too long, may cause the mineral to dry up and calcine.

It is also worth mentioning that, generally, minerals of all types have threshold temperatures where changes of colour occur. Between these threshold temperatures, only changes in the quality of colour occur. These threshold temperatures vary, of course, according to the type of mineral that is treated.

By way of non-restrictive examples of implementation of this process, one may refer to the description of the powders numbered 144 (classic heat treatment), 783 (heat treatment with a controlled duration) and 3947 (heat treatment in an inert atmosphere) in Table I.

The previous description referred exclusively to the direct treatment of preselected minerals. However, the same process may be used successfully after application of the minerals in or on a material, which is to be coloured. Once this application is completed, one obtains a given colour or quality of colour. After heat treatment of said material, one obtains another colour or quality of colour. Therefore, there is a transformation of the powder in the material, resulting in a simultaneous transformation of colour.

This is interesting considering the fact that the colour obtained after heat treatment, often differs from the one obtained when the same mineral is heat treated under the same conditions, but independently from the material. Therefore, this process multiplies the colours that may be obtained with a same mineral.

The materials which can be so-treated are numerous. Polyester resin, cement, metal, porcelain, glass and stone are included.

The modalities of application are extremely variable. The mineral may be applied and heat treated in the material or on it or, sometimes (as in the case of galena with cement), both in and on it. The heat treatment can be carried out either in ambient air or in a controlled atmosphere. This treatment can be carried out at various temperatures. In some cases, there is one or more threshold temperatures at which the reaction occurs (see the notes 758-9 in Table I). The conditions of cooling and rise of the temperature may vary. The heat source may also vary.

By way of non-restrictive examples of implementation of this heat process after application on or in a material, one may refer to the description given in Table I of the powders no. 3507 to 3512 (after application on stone); 5047.1 (after acid treatment and application in a polyester resin); 1563.1 (after acid, heat and ammonia treatments and application in a polyester resin); 1573 to 1576 (application on metal); 2466 (application on glass); 1519 (application in cement); etc.

Chemical Process

By chemical process, there is meant a treatment of one or more minerals either alone or mixed with other additives, with a reagent such as a strong acid, ammonia, cyanide, ether, etc.

This process transforms the colour or the quality of colour of the mineral. Consequently, it multiplies the number of colours that one may obtain with the same mineral and/or metal. Actually, different proportions of mineral and reagent will give different colours or qualities of colour (see notes 313 and 392 in Table I).

The treatment with the acids may be carried onto in an acid bath with only one acid or a combination of acids chosen among nitric, hydrochloric, sulphuric, thiophosphoric, tartaric, acetic and hydrofluoric acids. The colours or qualities of colour of a same mineral vary from one acid to another and/or from one combination of acids to another. The treatment may be carried out in ambient air and its duration may vary from immediate withdrawal to many years. The duration of the soaking also determines the colour or the quality of the colour (see notes 76, 261, 296, 352*a* and 487-8 in Table I).

The distribution of the mass of mineral, either horizontally or vertically (in the form of a column) in the acid bath influences the colours obtained with certain minerals (see notes 438, 510, 512 and 516 in Table I).

The drying may vary and determine the colour (see notes 33, 70, 442 and 484 in Table I). This drying may be natural or carried out on a hot plate, in a furnace, in a drying oven or on a sand bath. During the drying phase, one may vary the temperature in order to dry the solution or, still, bring it to the boiling point (see note 246 in Table I) and then remove or maintain it. A too high heating may scorch or darken certain minerals. The colour of some minerals becomes more intense when heating is very high.

The type of drying and its modalities also cause variations of colours and of qualities of colour. Thus, for example, the duration of the drying on a hot plate may determine the colour. It may make the colour or quality of colour vary in a positive or negative manner (see notes 481 and 625 in Table I).

Therefore, the acid treatment transforms profoundly and durably the colour or the quality of the colour of the mineral(s). This treatment allows to obtain colours which cannot be found among the natural minerals. Notably, it also allows to obtain unusual, diversified and pure colours, ViZ. colours that do not result from a mixing with other minerals or chemical or with metallic compounds. In this connection, it should be noted that all the minerals treated with thiophosphoric acid, became fluorescent.

From a practical standpoint, the mineral which is preferably but not necessarily reduced to a powder state or is in the state of a stone, may be treated in ambient air or in a controlled atmosphere. The quantity of mineral may be chosen as may be the quantity of acid used for the treatment. However, one must be sure that the mineral is entirely covered. Variations in the respective proportion of the mineral and acid will give variations in the colour or the quality of colour. Likewise, variations in the method which is used (duration of the soaking and/or the drying; nature of the acid(s) bath used [the acids may be fresh or used]); the degree of dilution of the bath; the use of only one acid or of a mixture of acids; the use of a single treatment or of successive treatments with the same acid, many different acids or, even, other reagents, such as ammonia, etc.) will bring variations in the colour or the quality of colour.

The proportions of mineral and acid(s) may therefore vary, as well as the duration of the soaking and the drying conditions. The different combinations of operative conditions, will give different colours. These observations apply to all minerals treated with acid.

As previously mentioned, the powder obtained by treatment of a mineral previously heated or not, with an acid or a combination of acids may be taken and treated again with another reagent, such as ammonia, according to the various modalities presented above. Such powder may also be calcinated at various temperatures in ambient air or in a controlled atmosphere. When the mineral is calcined before and/or after the acid treatment, either in ambient air or in a controlled atmosphere, such can be done under the above mentioned conditions (see the above chapter entitled "Heat Process").

By way of non-restrictive examples of implementation of this process of chemical treatment with an acid, one can refer to the description given in Table I of the powders numbered 2, 5 or 7 (treatment with acid only), 1143 or 1357 (treatment with acid and heat treatment) or 1122 or 1149 to 1151 (acid treatment, with heat treatment and further treatment with ammonia).

Instead of using one or more acids, one may use other reagents such as, for example:

- ether in which the mineral may be soaked for a given time, the drying being natural—see, by way of non-restrictive examples, the description given in Table I of the powders numbered 66, 71 and 3004 (treatment with ether only), 5664 (heat treatment and, afterwards, with ether) and 1050.1 (treatment with acid and, afterwards, with ether);
- ammonia, with which, as with the acids, variations in the treatment conditions will give different colours or qualities of colour—see, by way of non-restrictive examples, the description given in Table I of the powders numbered 67, 187 and 4164 (treatment with ammonia only); 1360 and 9964 (heat treatment and treatment with ammonia), . . . ;
- cyanide—see, by way of non-restrictive examples, the description given in Table I of the powders numbered 1359, 2626 and 4151.

Physical Process (Irradiation)

Treatment by irradiation is applicable to all minerals, either as such or in admixture with other, with the exception, however, of those of the "gem" type, for which test treatments by irradiation have seemingly been carried out in the past. By minerals of the "gem" type, there are meant the minerals used in jewellery, with the exception of gold and silver. These minerals include in particular corundum, spodumene, beryl, agate, zircon, garnet and tourmaline.

The treatment by irradiation, which is also applicable onto materials including minerals, transforms the colour or quality of colour of said minerals. For certain minerals, changes in texture, structure (crystallization) or, still, transparency sometimes accompany the change in colour or quality of colour.

Many different types of irradiation, can be used, such as X-rays, gamma-rays, electrons and neutrons, as well as laser beam. One may also irradiate a same mineral successively with a first type of irradiation and, afterwards, with a second type of irradiation. By way of non-restrictive examples of such a combination of irradiations, one may refer to the description given in Table I of the powders numbered 861 (electrons and gamma-rays), 1097 and 3225 (electrons and neutrons), 8068 and 10038 (neutrons and gamma-rays) and 8538 (X-rays and electrons).

Generally, the irradiation may be carried out in a continuous or discontinuous manner in ambient air or in a controlled atmosphere. The minerals may be irradiated either at normal temperature or after having undergone heat treatment. A same mineral irradiated at various doses, will give a range of colours or of qualities of colour. The reaction of the mineral to irradiation varies from one type of mineral to another. The colours of some minerals are transformed or slightly accentuated by every increase of the dose applied to them. This process is sometimes accompanied by significant modification thresholds. Certain minerals, originally colourless, become coloured when irradiated.

a) Gamma Irradiation

Conclusive tests were done at doses ranging from 0,01 to 600 Mrad.

More precisely, tests carried out in a UC-15 calibrator at the Canadian Irradiation Center (Armand Frappier Institute) at varying doses that totalized up to 600 Mrad. Glass bottles or fabric bags containing the minerals were inserted in the calibrator. The irradiation was continuous or discontinuous and showed evidence that it is possible to form ranges of colours or qualities of a colour with a same mineral by exposing it to different doses of irradiation. This process made the colour of the mineral to evolve through different doses of irradiation.

Other tests were carried out in a Gammacell® 220 manufactured by Atomic Energy of Canada Limited, with a cobalt-60 source of 6360 Curies. The certificate of measure of this apparatus indicated $5.01\times10^5$, 2.1% rad by hour.

By way of non-restrictive examples of implementation of this process, one may refer to the description given in Table I of the powders numbered 1013.1; 2361 a; 2996; 3300 to 3304 and 7153 to 7164.

b) Neutron Irradiation

In this case also, conclusive tests were carried out in a flux of slow thermic neutrons, during approximately 5 hours in the reactor of the Mc Master University in Hamilton, Ontario, at $10^{12}$ neutrons/cm$^2$/sec. The samples of different minerals were put in individual plastic capsules and fed into the reactor.

Other tests carried out in a mixed flux of neutrons and gamma-rays in the nuclear reactor of the "Institut de génie énergétique" at the École Polytechnique in Montreal. Samples of the same minerals were treated in the reactor with a flux at $10^{12}$ neutrons/cm$^2$/sec during different times, in order to form a range of colours or of qualities of colour. An irradiation of 1,667 rad per second was emitted.

By way of non-restrictive examples, one may refer to the description given in Table I of the powders numbered 4668, 5914, 8501 to 8506 and 9554 to 9561.

c) Electron Irradiation

Conclusive tests carried out in the Radio-oncological Departments of the Montreal's General Hospital and Notre Dame Hospital in Montreal on minerals which were treated either in the state of powders inserted in gelatine capsules, or in the form of stone.

The stones or capsules were placed at a short distance from the collimator of a Clinac® 18 apparatus producing electrons at 18 and 20 MeV. The total doses applied ranged from 50,000 to 170,000 rad at a degree of application of 5 to 500 Mu (monitor unit) per minute.

Still in this case, the colour of the tested minerals evolved according to the intensity and duration of the irradiation.

By way of non-restrictive examples of implementation of this process, one may refer to the description given in Table I of the powders numbered 2995, 3099 to 3102, 8440, 8441 to 9227 and 9228.

d) X-Rays

Conclusive tests carried out at the "Laboratoire de diffraction des rayons X" of the Chemistry Department at the University of Montreal. The equipment used consisted in a Philips® generator operated with a copper tube. The conditions of its use were standard, ViZ. a 20 mA current was applied under a 40 kV voltage. Each sample was treated separately and its exposition lasted for seven days. Each sample was put in a separate sample holder placed directly at the outlet of the primary beam of the generator.

Other tests were carried out at Sainte-Justine Hospital in Montreal. More precisely, 139 minerals, samples of polyester resin, of transparent and opaque white enamel paint, as well as samples of transparent and opaque white ink, which were all pigmented with minerals, were irradiated by X-rays with a Philips® therapeutic apparatus, operating a radiogene tube in tungsten, usually used for medical purposes, during 4 hours at a rate of 448 shots every 30 seconds, each shot lasting 1⁄10 of a second at 100 milliamperes and 70 kV at a distance of 40 inches.

By way of non-restrictive examples of implementation of this process, one may refer to the description given in Table I of the powders numbered 3840, 3907 and 8538.

e) Laser Irradiation

Conclusive tests were done in the laboratory of the "Laser-Matter" group at INRS-Energie, with a Lumonics® excimer laser model Hyper EX-400, the amplification medium of KrF. This laser emits a coherent multimode UV irradiation having a 249 nm wavelength, which is transmitted in the form of impulsions having a duration of 30 nanoseconds and an energy of approximately 200 mJ. This laser functions at a rate of repetition of 20 Hz.

Two different sources were used. The only differences between the two lasers used for these experiments were in the structure of the beam and, in no case, such affected the results. In one case, the beam had the form of a square of 2 cm×2 cm at the outlet of the laser and had a divergence of approximately 0.4 Mrad. A lens having a focal length of 30 cm was used, in order to concentrate the laser beam on the sample which should be irradiated. Thus, one could reach a maximum density of strength of $10^{10}$ W/cm$^2$. In another case, the beam had a rectangular form of 2.3 cm×0.6 cm and its divergence was inferior to 0.2 Mrad. A lens having a focal length of 30 cm was used, in order to concentrate the laser beam on the sample which should be irradiated. Thus, one could reach a density having a maximum strength of the order of $10^{10}$ W/cm$^2$.

The intensity of the radiation reaching the sample could be modified by moving the sample away from the lens or bringing it closer. The energy of the beam was measured with the help of a Scientech® 365 calorimeter before and after irradiation.

From a practical standpoint, the tested samples were irradiated until a change was observed or until it was damaged. The duration of exposition varied from 0.5 min to 35 minutes; the irradiated surface was of 0.0025 cm$^2$ at 0.7 cm$^2$; the laser energy of 0.160 J to 0.245 J; the flux of $2.8\times10^9$ W/cm$^2$ to $1.0\times10^7$ W/cm$^2$ and the total energy of 2.2 J to 1300 J.

By way of non-restrictive examples of implementation of this process, one may refer to the description given at Table I of the powders numbered 3062, 3395, 3519, 3541, 5906, 5944, 7181-2 and 9941.

f) Treatment by Irradiation after the Application on or in a Material

As in the case of the heat process, the treatment by irradiation may be used successfully after application of the minerals in or on the material to be coloured.

When one applies a mineral on or in a material, he or she does not necessarily obtain an interesting colour result (ex.: colourless, light cream, light grey, light beige). If he or she then proceeds with an irradiation, a transformation of the colour or quality of colour may be obtained. In most cases, a mineral irradiated independently from a material, gives a colour or quality of colour which may either differ totally or be similar to the one obtained when the same mineral is applied in the material and, afterwards, irradiated. Furthermore, the colour or quality of colour obtained after irradiation differs from one material to another and, moreover, from one type of irradiation to another. Therefore, the implementation of this process permits to transform the colour of minerals after their application in a material, either radically or moderately.

The conditions of implementation of this treatment are similar to those previously described. The treated materials can also be treated thermally before they are irradiated. The irradiation can be carried out in ambient air or in a controlled atmosphere. It can also be carried out at a variety of doses. Among the sources of irradiation that can be used, one can cite X-rays, gamma-rays and electrons. Other sources of irradiation may also be used.

By way of non-restrictive examples of implementation of this process, one may refer to the description given in Table I of the powders numbered 923.2 (after application in PYREX®); 6819.1 (after heat treatment, acid treatment and application in PYREX®; 3064 (after application on cement and heat treatment); 3142 (after application in cement and heat treatment); 657 (after heat treatment, acid treatment and application in a concrete polymer); 511 to 513 (after acid treatment and application in polyester resin); 530-1 (after application in ink); 586 (after application in enamel); etc.

Application of the Coloured Powders According to the Invention

As previously mentioned, the powders of the colour system according to the invention are usable as pigments in numerous fields, but more specially for the colouring of architectural materials. Numerous examples of coloured materials according to the invention have already been mentioned (see the above description of the "thermal process" and "physical process"). The following additional examples will illustrate in a non-restrictive manner other possible applications of the powders of the system according to the invention.

EXAMPLE No. 1

Application of Coloured Powders as Pigments on Plastic

Tests of application of many coloured powders according to the invention were carried out on many different plastics, including UVEX®, polystyrene, acrylic and polycarbonate. The powders, which have been thus tested are those numbered 11, 34, 92, 96, 526, 537, 563, 581, 603, 607, 621, 1138, 2207 and 4226 in Table I.

First Method of Application a) 1 g of each pigment, reduced to the state of powder, was applied as a pigment on the surface of a square piece of each plastic, measuring 1"×1".

b) These pieces were then put in rows on an asbestos sheet and heated up to the "formability" temperature of each plastic:

1) UVEX®: between 265° F. and 320° F. for an average of 292° F.; it starts to deform at 77° C.
2) Polystyrene: between 365° F. and 385° F. for an average of 375° F.; it starts to deform at 200° F. and higher.
3) Polycarbonate: between 440° F. and 475° F. for an average of 457° F.; it starts to deform at a maximum of 325° F.
4) Acrylic: between 260° F. and 360° F. for an average of 310° F.; it starts to deform between 71° C. and 95° C.

c) The deposited mineral pigments remained in suspension at the surface of the plastic material. Then, they were covered with a layer of transparent catalysed resin in order to fuse them with the plastic material to which they were already glued under the action of heat.

Second Method of Application 1 g of coloured powder was grinded with a transparent resin. The coloured resin that was so obtained was uniformly applied afterwards in a thin layer on the four plastic material.

Third Method of Application

Pieces of the same four plastic materials, measuring 1"×1", were prepared.

A small quantity of coloured powder was applied onto the surface of each piece. Methylene chloride was then added.

As it was added, the pigment integrated itself gradually to the surface of the plastic material. Afterwards, the pieces were covered with a layer of transparent catalysed resin in order to glue solidly the pigment to the plastic material.

These three methods of application proved to be very efficient when applying a layer of mineral pigments at the surface of a plastic material.

The first method allowed creation of marbling effects at the surface of the plastic, whether it was transparent or opaque. Therefore, it showed that it is possible to fabricate decorative plastic surfaces imitating marble. Not only can one imitate marble, but also the colours of the marbling can vary according to the colour of the mineral pigment that is used.

The second method allowed obtention of a tinted varnish or an opaque paint, depending on the pigment's potential to make opaque, permitting to cover and thus varnish or paint the surface of the plastic material.

The third method, as the first one, allowed fabrication of decorative plastic surfaces, which imitate marble.

Thus, this particular application done exclusively on plastic surfaces could have a great impact on the interior design of buildings.

EXAMPLE No. 2

Applications of Coloured Powders as Pigments in Plastic

Almost 1000 different tests of application of mineral pigments in transparent polyester resin were carried out.

The processing followed during these tests is as follows:

50 cc of polyester resin no. 2T323 commercialized by MIA CHEMICALS were used. The selected quantity of pigments was mixed manually with a small quantity of resin and the obtained mixture was integrated into the remaining resin. The resulting mixture was then stirred with a spatula and left to decant for a few minutes. The coloured or tinted resin thus obtained was then decanted in another receptacle and 2% by weight of a polymerization catalyst were added and mixed with a spatula. After hardening at 100° F., the piece of resin obtained was unmoulded, carved and polished. The colour observations were made at point.

In order to demonstrate that the pigments according to the invention are usable in the field of design, miniature pieces were fabricated, having the form of a pyramid, of rectangular blocks and of elongated half-spheres. Looking at these forms, one can observe increasing concentrations of a same pigment going from transparency to opacity.

This distribution of the pigment is interesting because it could very well be applied to furniture, to the bodies of cars fabricated with resin, to boats, etc.

The pigments which have been tested, included in particular the natural mineral pigments numbered 11, 34, 96, 526, 537, 607, 621, 1138 and 2207 in Table I, and the heat treated pigments numbered 4226 and 4789 in the same Table. Each of these thirteen pigments was applied successively in various proportions of 0.12 g, 0.5 g, 0.1 g, which resulted in three curves of varying concentrations of a same colour. The natural pigments numbered 92 and 563 were also tested with different successive proportions of 0.18 g, 0.12 g and 0.6 g.

The visual effect, which was obtained, was similar to that of the rainbow. However, instead of having different colours, strata of a same colour differing in tonalities were obtained.

Other conditions of application are possible and can result in a variety of colours or of qualities of a same colour. Thus, for example, the catalyst may be added firstly to the resin; the mineral powder, secondly and the resulting product may then be mixed while the resin is still liquid, in ambient air or in a controlled atmosphere with or without heat treatment. The quantity of catalyst may of course vary.

Generally, the tests which were carried out showed that the mineral pigments, transformed according to the invention can be applied to transparent polyester resin.

The colours of all the mineral pigments which even transformed, became more vivid and their quality was frequently modified totally or partially when applied in transparent polyester resin.

Certain mineral pigments, natural or transformed, react as dyes in transparent polyester resin. In other words, they "tint" the resin, with an intensity which varies according to the degree of concentration of the pigment. In this case, the mineral pigment does not give opaque colours; the resin remains translucid, and even transparent with a more or less accentuated tint.

Other pigments, either natural or transformed, react as "colorants" in transparent polyester resin. The colour reaches a degree of saturation, even when there is a small quantity of such pigment. The quantity required to saturate the colour, depends on each mineral. Generally, these pigments make the resin opaque very easily.

An increasing concentration of certain mineral pigments, either natural or transformed, gives a resin with an aspect ranging from transparency to opacity. Such an increasing concentration of mineral pigments, also modifies the colour or the quality of the colour.

Tests of transformation by irradiation of the tints or colours of the pieces of polyester resin that were so prepared were also carried out. These tests done in the conditions mentioned above, have shown that the colour of all the pieces of resin, whether they were tinted, coloured or transparent, changes under the action of the irradiation and that, for a same pigment, this colour changes according to the type of irradiation used and, also if the pigment is irradiated before or after it is integrated to the resin.

In this connection, one may refer to the description given in Table I of the following materials:

| Pigments irradiated independently from the resin | | Pigments applied in the resin and then irradiated | Pigments applied in the resin and then irradiated |
|---|---|---|---|
| gamma | electrons | with gamma rays | with electrons |
| 941–2 | 943–4 | 8754 | 8737/8738 |
| 915–7 | 1228–1241 | 3461 | 5527/8940 |
| 1266–7 | — | 3457 | 2828 |
| 1284–5 | — | — | — |

-continued

| Pigments irradiated independently from the resin | | Pigments applied in the resin and then irradiated | Pigments applied in the resin and then irradiated |
|---|---|---|---|
| gamma | electrons | with gamma rays | with electrons |
| 2425–6 | 1462–3 | 3586 | 3079/5462 |
| 2438 | 2852–4713 | 3449 | 2890 |
| 2438 | 2852–4713 | 3408 | 2902 |
| 8759 | 9049 to 9052 | 3197 | 2829/7222 |
| 1109 | 9008 | 3191 | 3138 |

Of course, this offers enormous possibilities of applications for decorative and/or industrial purposes.

EXAMPLE No. 3

Application of the Coloured Powders as Pigments in Cement

Tests of application of many coloured powders according to the invention were carried out in white Portland cement (type 10 ACNOR/CSA A5).

a) Cement mixed with water

During these tests, different quantities of powders according to the invention were used as pigments. These powders were mixed with cement and water. Except for a few cases, the mixing conditions were the same. During the tests, the selected quantity of pigment was mixed with 4.50 g of white Portland cement and 3 cc of water or with 27.40 9 of cement and 13 cc of water. Grinding and blending of the mixture were carried out manually. The product so obtained was then moulded in a plastic container and left to harden in ambient air.

These tests have proven that all the tested mineral pigments may be applied adequately in concrete when it is mixed with water.

Certain mineral pigments according to the invention have coloured the concrete. Thus, for example:

- 0.50 g of the powder numbered 487 in Table I added to 4.50 g of cement, gave, in the conditions mentioned hereinabove, a piece of cement which had a light bluish turquoise blue colour;
- 1 g of the powder numbered 934 added to 4.50 g of cement, gave a piece of cement which was of a very light bluish green; and
- 1 g of powder numbered 4060 added to 27.40 g of cement gave a piece of cement which had a very light chamois colour.

Other mineral pigments according to the invention have tinted the concrete cement and given a texture to the concrete fabricated with this tinted cement.

By way of examples, such tests have proved that the grey soapstone which generally produces beige, pinkish beige and very light greyish beige tints, actually gives a pearly finish to the concrete cement when it is used in it. Therefore, the grey soapstone reacts positively by giving a texture to concrete, even if it gives just a slight tint to the material instead of a strong colour.

Of course, other mineral pigments could be added to obtain different tints or colours. By way of example, blue asbestos added to it in its natural state and when applied in white cement, gives to the same a pearly texture while remaining a "clear and cold grey". Chrysocolla previously treated with nitric acid, also gives a pearly texture to white cement.

By way of examples of a pearly texture that were so obtained, one may refer to the description given in Table I of the materials identified by the numbers 3895 to 3897; 4758 and 4759; 5093 to 5093.2; 6463; 8545 to 8548, 8638 to 8641; 9405 and 9406; etc.

By way of examples of a metallic texture which may be obtained, we may refer to the description given in Table I of the materials 526 and 1138.

It should be noted that, generally, the colours obtained by mixing white cement with water and mineral pigment are pastels. A few tests carried out with grey cement, gave "tints" rather than colours, except in a few cases. All of this obviously depends on the quality of the pigment being applied. In this connection, one may refer to the description given in Table I of material 2065 where, a same pigment applied successively in amounts of 1, 2, 3 and 6 g to a same amount of cement (4 g) mixed with 6 cc of water, gave colours that are respectively pastel azure, intense azure, very powerful azure and finally greenish blue.

By increasing the amount of mineral pigment that is used, one may therefore intensify the tint or the colour obtained. One may even obtain a change of colour.

It should also be noted that, after the application of the mineral in the cement, the latter may be exposed to irradiation and/or to heat treatment, as it has been explained hereinabove, in order to obtain changes of colour, tint and/or texture. By way of non-restrictive examples, one may refer to the description given in Table I of the materials numbered 1071 and 3142 (irradiation with gamma rays); 4148 to 4150; 7295 to 7297 and 5347 to 5354 (heat treatment); or 4034.1 (irradiation and heat treatment).

It should further be noted that no "secondary" effect has been noticed in the case of irradiation treatment. However, heat treatment has weakened the cement, which cracked and became friable.

b) Polymer Cement

Similar tests were made with a cement mixed with a polymer composition used for concrete. This composition was made of a polyester concrete resin of the type C-001 (Fiberglass Canada Inc.), a CADOX® M-50 (Akzo Chemicals Inc.) polymerization initiator and a 6%-cobalt based accelerator sold by Dussels Campbell Ltd.

During these tests, the pigment at the state of powder was weighed. It was mixed with 6 cc of polymer for concrete, 0.18 cc of catalyst and 1.50 mg of cobalt 6%. 4 g of white Portland cement were then added. After manual crushing and grinding, pieces of cement were moulded and left to harden in ambient air.

Generally, there is a compatibility between the mineral pigments, the cement and the polymer for concrete. The colours that are obtained are very vivid, even when the pigments are used in weak quantities. Amongst these colours, pastel tones were not found, as were the majority of the colours obtained when the pigments were mixed with white Portland cement and water. The colours are vivid when the cement is mixed with polymer concrete.

By way of examples of the results that were obtained, one may refer to the description given in Table I of the materials numbered 546, 581, 1371, 2207, 3147, 3287, 3730, 4285, 8640.

As previously mentioned, one may obtain a variation and, furthermore, a change of colour by increasing the quantity of the pigments (see the description of the materials numbered 971 and 972). In practice, it was observed that the addition of cement may start reactions. The appearance of certain colours is good in polymer, but they modify themselves when they come into contact with the cement, which can make the colour dull or put it out, giving it a milky or greyish tint (see the description of the material numbered 973).

Furthermore, it was observed that certain pigments, particularly iron oxides, are naturally siccative when they are applied in concrete polymer.

Therefore, some mineral pigments colour the cement mixed with concrete polymer; others tint it. It all depends on the nature of such a pigment or, still, on the amount of the same that is applied. Some pigments also give a texture to the cement mixed with the polymer (see the description of the materials numbered 367, 8639 and 8640, 9406, etc.).

Once again, the cement may also undergo heat treatment or irradiation (see the description of the materials numbered 966, 1218 to 1220, and 2065, who have all been treated with gamma rays).

EXAMPLE No. 4

Application of Galena Powder on and in Cement a) Tests of application of galena on cement have been carried out.

During these tests, a galena powder was applied onto the surface of a piece of humid or dried cement and, then, was subjected to a heat treatment. When the galena melted, it formed a decorative coloured glaze. The colour varied according to the treatment temperature.

By way of examples, one may refer to the description given in Table I of the materials numbered 1516 and 1517, 3063, 3064 (for which a treatment by irradiation has also been carried out), 6621 and 7810 to 7813.

It is worth noting that the galena deposited on the surface of a humid piece of cement becomes impregnated with the cement when the latter is drying and hardening. After heat treatment, the glaze which is formed is not really apparent. In order to obtain a glaze which is very evident and clearly "articulated", it is better to apply the galena on the cement after drying of the latter.

From a practical standpoint, the colour of the glaze varies according to the thickness of the layer of galena powder applied onto the surface of the cement. For example, at a same temperature, if the layer is thin, the glaze may be "yellow" or "orange" and flat. However, if the layer is thick, the glaze may be "green" and brilliant.

The colour of the glaze at the surface of the cement varies according to the pigments or the chemical products which are integrated to the mass of cement. The components within the cement influence the colour of the glaze on its surface, when heat treated.

b) Other application tests with galena were carried out, but in the cement rather than on the cement. These tests showed that galena does not only colour the cement, but also reinforces it since it cracks and breaks under the action of the heat.

EXAMPLE No. 5

Application of the Coloured Powders on and in the Glass a) Application of Galena Powder on a Window Pane Galena was crushed to a fine powder state. A selected quantity of this powder was applied on a piece of window pane measuring 1"×1"×⅛", which was then inserted in a cold furnace. The temperature was raised to a selected value in a gradual manner. Likewise, the cooling was done slowly in the furnace.

The tests that were carried out, showed that galena forms a glaze which adheres permanently to the window pane and that colours and colour qualities are obtained, which differ when a same amount of galena applied on the glass is heat treated at different temperatures (see the materials numbered 2466, 3357, 3375, 3376 and 3842 in Table I).

These tests also showed that, when one combines galena to one or more other natural (ex.: sulphur) or transformed mineral(s), colours or qualities of colour are obtained, which differ from those obtained by heat treatment in combination with a chemical product (see the materials numbered 2575, 2703, 3377, 3778 and 3940 in Table I).

b) Application of the Coloured Powders on Pyrex®

Pyrex test tubes were used for this purpose.

Firstly, the round far end of the tube was heated on its exterior by means of an oxyacetylene welding torch. Afterwards, a selected quantity of pigment was sprinkled on this surface, while it was in a state of heat expansion. The pigment adhered to the tube, which was immediately reheated with the oxyacetylene torch until the desired effect was reached. The cooling in ambient air was immediate (withdrawal of the torch).

A first test with galena (see material 3834.1 in Table I) gave a flat and translucid glaze.

A second test with tellurium gave a flat glaze, milky and translucid, resembling frost (see material 681.1 in Table I).

An almost transparent glaze was formed during a third test with molybdenite, which had previously been heated from 0° F. to 1300° F. and maintained at 1300° F. during 4 hours (see material No. 2998.1 in Table I).

These three glazes were irradiated with gamma rays. Such gave other colours or qualities of colour.

c) Application of Powders on Molten Glass

Approximately 150 g of molten glass of the type used by glass-blowers, which is called "sodalime", was taken with a metal rod at a state of fusion in a furnace at 1200° F. Mineral powder was sprinkled on the surface of the molten glass, or the molten glass was rolled in the mineral powder, depending on the case. The resulting product was then reintroduced into the furnace and melted with a flame of 1200° C. The molten glass was then taken off the metal rod.

Five mineral powders were tested as pigments on the surface of sodalime glass: tellurium, selenium, galena, sulphur and molybdenite.

Each of these mineral powders reacted differently at the surface of the glass.

Tellurium formed a glaze which adhered permanently. This glaze was translucid, of a "clear yellowish cream" colour, with a flat and milky texture. In this case, a greater quantity of pigment lightly accentuated the colour and the impression of frost (see the materials numbered 561.2 and 561.3 in Table I).

Galena formed an opaque glaze, which adhered permanently to the sodalime glass. This glaze was generally a "yellowish olive green" and increased in intensity as the quantity of pigment increased. This glaze gave to the glass the impression of having the earthy texture of ceramic. It was simultaneously flat and brilliant, depending on the areas (see the powders numbered 2399.1; 2452.1 and 2462.1 in Table I).

Molybdenite formed a glaze, which adhered permanently on the sodalime glass. This flat glaze was almost as transparent as a film. Before its application, the molybdenite had previously been heated at 1300° F. and maintained at this temperature during 4 hours, turning into a "clear yellow" pigment. This pigment is the one that was applied on the sodalime glass (see the material numbered 3108 in Table I).

After application of selenium in the molten glass, the latter remained "transparent white". The piece of glass, at the state of fusion, was rolled in the selenium powder. At that time, the glass was covered with what seemed to be a layer of red pigment. However, after having been reinserted into the furnace and reheated, this layer of red pigment disappeared and the glass just became "transparent white".

Finally, 1 g of sulphur was applied on 150 g of sodalime. This gave a very "cristalline white" glass.

d) Application of Powders in Crystal

Some extremely satisfying tests were carried out in crystal. During these tests, 1% or 2% of mineral powder was integrated to the molten glass before it was blown. The mixture was mixed and melted at 2400° F. The crystal that was so obtained was coloured or tinted, but remained translucid.

By way of examples, one may refer to the materials numbered 1139.1; 1840.1; 2028.1 and 2501.1 in Table I.

e) Application of Powders in White Transparent Glass

Selected quantities of mineral powders were applied in 6.50 g of white transparent glass powder. The glass powder was a crudely crushed glass, called "spruce pine batch". Because the crushing of the glass was more or less appropriate, the powder used was of the size of coarse salt. Once the mixture was made, the mass obtained was put on a ceramic plate and the whole was heated in a Pyradia furnace in ambient air from 0° C. up to 1000° C. Once the temperature of 1000° C. was reached, heating was stopped and the glass was left in the furnace, which cooled down progressively.

This coloured, tinted or gave a texture to the glass.

By way of examples, one may refer to the materials numbered 2208.1 or 2960.1; 1514.1 or 4764.1; 1020.1 or 1102.1 (very bright colours); 2960.1 or 9350.1 (tints); 6751.1 or 8152.1 (texture); and 1576.2 or 2630.1 (medley of colours).

f) Application of Powders in Pyrex®

By proceeding in a similar manner, tests were done successfully in Pyrex®.

By way of examples, one may refer to the materials numbered 923.1; 2730.1 and 9731.1 in Table I.

g) Irradiation

As in the case of the other tested materials, the colour or quality of colour of a glass in or on which a mineral powder has been applied according to the invention may be modified by irradiation.

In this connection, one may refer to the following materials given by way of non-restrictive only examples in Table I.

| No. | Type of irradiation | Type of glass |
|---|---|---|
| 2026.1 | gamma | crystal |
| 3834.1 | gamma | Pyrex ® |
| 2960.1 | gamma | spruce pine batch |

The colour or quality of colour obtained with a pigment applied at the surface or integrated to the mass of glass may also be modified with other types of irradiation (ex.: electrons, neutrons, X-rays, etc.). In fact, the colour or quality of colour of the glass may be modified by combining various types of irradiation, as it was the case for certain minerals (see the materials numbered 911, 985, 1097, 3225, 3840, 4916, 8068, 8537, 8539, 8698, 8882, 10028 to 10032, 10036, 10038 and 10094 in Table I).

The conditions of irradiation may vary. Thus, for example, the glass may be hot at the time of irradiation or the irradiation may be carried out in a controlled atmosphere.

Melting of the glass may also be carried out by irradiation with a laser beam. The powerful and sudden thermal shock, which the laser beam produces, does not only give interesting modifications of the colour. As a matter of fact, it also gives modification to the material as such.

Finally, transformation of the colour or quality of colour by irradiation may also be applied to materials which have glass as one of their components, whatever be the type of such materials (ex.: Corningware®).

EXAMPLE No. 6

Application of Coloured Powders in the Paper Pulp

Tests of application of mineral pigments to the invention in the paper pulp were done at the Reed Company in Québec City. The paper pulp, used for this purpose, was of a commercial whitened sulphite type (85% white).

During these tests, the pigment was firstly reduced to a powder state with a steel pestle and a bronze mortar. A given amount of this powder was added to 5.60 g or 6.70 g of humid paper pulp, as well as up to 500 ml of water. The mixture was stirred in an industrial blender and the obtained paper pulp was transformed into sheets according to standard process. The sheets thus obtained were dried in ambient air between two blotters maintained between two metal plates.

All the tests, which were thus carried out, were satisfactory. The mineral powders that were tested gave interesting colours or qualities of colour to paper pulp.

| No. of the powder in Table I | Method of application | Colour Obtained |
|---|---|---|
| | a) Normal Colouring Tests | |
| 4818 | 1 g with 6.70 g of paper pulp (addition of 500 ml of water/mixing in blender/formation of the sheet with the "British shut machine"/drying between blotters) | clear orange |
| 4226 | .02 g with 5.60 g of paper pulp | very clear rose Burgundy |
| 4226 | .05 g with 5.60 g of paper pulp | clear red Burgundy |
| 4226 | .20 g with 5.60 g of paper pulp | red Burgundy |
| 4226 | .50 g with 5.60 g of paper pulp | red Burgundy more accentuated than the "red Burgundy" |
| 4226 | 1 g with 5.60 g of paper pulp | red Burgundy still more accentuated |
| | b) Tests of Tint | |
| 581 | 1 g with 6.70 g of paper pulp | very clear cream |
| | c) Tests of Texture (Pearly Effect) | |
| 367 | 1 g with 6.70 g of paper pulp | very clear pearly grey |

-continued

| No. of the powder in Table I | Method of application | Colour Obtained |
|---|---|---|
| | d) Tests of Texture ("Fibrous" Effect) | |
| 11 | 1 g with 6.70 g of paper pulp | clear grey |
| 11 | 3 g with 6.70 g of paper pulp | grey more accentuated than the "clear grey" |
| 11 | 8 g with 6.0 of paper pulp | grey still more accentuated |
| | e) Tests of Texture (Metallic Effect) | |
| 1138 | 1 g with 5.60 g of paper pulp | metallic grey |
| 1138 | 3 g with 5.60 g of paper pulp | more accentuated metallic grey |

This positive result is very interesting because of the possible applications in the field of interior and exterior building planning.

Thus, in the case of interior planning, the mineral powders according to the invention could be used for the fabrication of wallpaper or for the colouring of arborite or formica prepared with coloured paper. This could have interesting consequences for the interior planning of buildings (wall panels, kitchen counters, furnitures, wall coverings, etc.).

In the case of exterior planning, the mineral nature and the non vulnerability to solar rays of most of the powders according to the invention would also make it possible to use products fabricated with coloured paper, such as arborite, something which has never been done yet.

EXAMPLE No. 7

Application of Coloured Powders to Enamel Paint

Mineral powders according to the invention were tested as pigments in a opaque white enamel metal paint used for domestic purposes.

For this purpose, predetermined amounts of 0.25 g, 1 g, 1.50 g and 2 g of mineral powders were successively applied in 1 cc of white opaque metal paint used for domestic purposes or 1 cc of white transparent and white opaque paint used for painting car bodies (Supermax® P-875 and P-002).

The pigments were mixed with the paint and grinded manually with a frosted glass knurl on a frosted glass plate. The paint was applied with a brush on pieces of metal measuring 5"×5".

These tests were all positive whatever were the powders. They also showed that the use in "normal" quantities of these powders did not affect the adhesion, the viscosity or the speed of drying of the paint.

These tests further showed that some mineral pigments colour the opaque or transparent white enamel paint; others tint it. In the latter case, the effect is similar to a tinted varnish. These same pigments always become opaque, however, when they are mixed with an opaque white paint.

Other mineral pigments gave a texture to the opaque or transparent white enamel paint. After application on the metal, the colour was like a texture.

| No. of the powder used for the test in Table I | Transparent white paint | White opaque paint |
|---|---|---|
| 105 | 1 g + 1 cc of paint/ manual grinding/ application with a brush = dark metallic grey (gold reflection) | 1 g + 1 cc of paint/ manual grinding/ application with a brush = clear metallic grey |
| 1138 | .25 g + 1 cc of paint/ manual grinding/application with a brush = clear iron grey | .25 g + 1 cc of paint/ manual grinding/ application with a brush = dark metallic grey |
| 2629 | 1 g + 1 cc of paint/ manual grinding/application with a brush = grey (almost black) | 1 g + 1 cc of paint/ manual grinding/ application with a brush = medium iron grey (light blue reflection) |
| 3730 | .25 g + 1 cc of paint/ manual grinding/ application with a brush = medium brown (orange tone) | .25 g + 1 cc of paint/ manual grinding/ application with a brush = clear beige (orange tone) |
| 4745 | .25 g + 1 cc of paint/ manual grinding/ application with a brush = medium rusty orange | .25 g + 1 cc of paint/ manual grinding/ application with a brush = clear beige (pinkish orange tone) |
| 4810 | .25 g + 1 cc of paint/ manual grinding/ application with a brush = brownish orange (light pink tone) | .25 g + 1 cc of paint/ manual grinding/ application with a brush = pinkish chamois |

Tests for resistance to the solar rays were also carried out. For this purpose, samples were exposed in a window, in the upper part of a two storey house, oriented directly towards the South. These samples were sticked on a carton, covered with an ordinary glass-pane. The duration of the exposition was more than 10 months (from the 3rd of December 1989 to the 15th of October 1990).

| No. of the powder in Table I | Preparation of the paint | Colour obtained after the preparation | Colour obtained after the exposition |
|---|---|---|---|
| 3649 | 1 g + 1 cc of opaque white/manual grinding/application with a brush | clear beige (salmon tone) | more accentuated beige (salmon tone with a more pronounced orange aspect) |
| 3650 | 1 g + 1 cc of opaque white/manual grinding/application with a brush | beige considerably darker than tbe previous (orange tone more acute) | beige more accentuated (orange tone more acute) |
| 3651 | 1 g + 1 cc of opaque white/manual grinding/application with a brush | beige less dark than the previous (orange tone more accentuated) | beige more accentuated (orange tone more acute) |
| 3652 | 1 g + 1 cc of opaque white/ manual beige grinding/application with a brush | pale brownish (light orange or pink tone) | pale brownish beige more accentuated (orange more acute) |
| 3732 | .50 g + 1 cc of opaque white/ manual grinding/ application with a brush | pinkish chamois (light grey tone) | lightly clearer chamois (purplish pink tone) |

Resistance tests showed that the colour of the majority of the samples accentuated itself when it was exposed to solar radiation. This reaction corresponds to the one obtained during the gamma radiation of the mineral pigments: the colour accentuates itself instead of becoming more pale as it happens with the majority of the pigments presently in use.

Therefore, it is evident that the mineral powders according to the invention can be applied successfully to synthetic enamel paint. The mineral colours applied do not deteriorate with the passage of time, even when they are exposed to solar radiation, as it happens with cars within a year. On the contrary, they ameliorate themselves.

This durability is a major asset for metallic interior and exterior coverings of buildings and even for the construction of metallic roofs.

Irradiation tests on the pieces of metal painted with an enamel paint for cars, which were coloured with powders according to the invention, were also carried out.

These pieces were irradiated at the Irradiation Center of Canada at the Armand Frappier Institute, in a UC-15 calibrator.

Many samples of a same piece were irradiated successively at various intensities, in order to produce a range of colours or qualities of colour and to identify the transformation thresholds. The different doses applied were: 3.33; 5; 7.54; 10; 11.31; 15.08; 18.85; 57.4; 102.4; 201.6; 247.6 and 360 Mrad.

| No. of the powder in Table I | Preparation and application | Colour obtained after application | Nos. of the powder after irradiation in Table I |
|---|---|---|---|
| 73 | 1 g + 1 cc of transparent white /manual grinding/ application with a brush | medium beige | 8613/4521/6860 7771/9023 |
| 163 | 1 g + 1 cc of transparent white /manual grinding/ application with a brush | cream | 6431/2133 to 2135/2153 to 2158 |
| 254 | 1 g + 1 cc of transparent white /manual grinding/ application with a brush | clear yellowish beige | 9060/2259/2260 9846/9061/7737 9066 |
| 410 | 1 g + 1 cc of transparent white /manual grinding/ application with a brush | cream (beige tone) | 664/2142/2143 7524/5652 |

Therefore, one can transform the colour or quality of colour of a synthetic enamel paint, either transparent white or opaque white, by irradiation with gamma rays. It follows that the colour of an object already fabricated and painted may be modified by this type of irradiation.

One may also note that the colour of the enamel paint evolves according to the degree of irradiation. Thus, one can obtain a range of colours or qualities of colour by using the same mineral pigment.

Conclusion

As one may now understand, the coloured powders according to the invention are usable as pigments in many fields. In addition to the applications described above, numerous other tests of application have been carried out successfully on materials as diverse as inks (notably those usable in serigraphy), stone, porcelain, ceramic, latex paint, metallic coverings, etc.

This confirms that the present invention offers a complete system of colours which, by their mineral nature are particularly useful for colouring modern architectural materials.

Of course, various modifications could be made to the colour system as well as to the processes of preparation and methods of application which have just been described hereinabove without, however, departing the scope of the present invention, as it is defined in the appended claims.

ANNEXES

I wish to express my warmest gratitude towards XEROX Canada Ltd. and most particularly to Mr. Angelo Testaguzza, as well as Mr. Claude Giroux, two eminent senior executive members, for having graciously and honourably allowed the reprography of my voluminous document, so patiently and competently done by Mr. Robert Delorme.

Permit me also to thank Rolland Inc. of Montréal, who spontaneously provided me with a considerable amount of good quality paper, thus contributing to the success of my venture.

To all these people, thank you very much.
What may have seemed to be «little» for you,
was a «lot» for me.

p. iii

INDEX OF THE COLOUR SYSTEM

PAGE

1.0 WHITE 1.1 white . . . . . . . . . . . . . . . . . . . . . . . . . . . 1

1.1.1 white (lilac reflection) . . . . . . . . . . . . . . . . 29
1.1.2 white (blue reflection). . . . . . . . . . . . . . . . . 30
1.1.3 white (turquoise reflection) . . . . . . . . . . . . . . 31
1.1.4 white (green reflection) . . . . . . . . . . . . . . . . 31
1.1.5 white (cream reflection) . . . . . . . . . . . . . . . . 34
1.1.6 white (yellow reflection). . . . . . . . . . . . . . . . 36
1.1.7 white (orange reflection). . . . . . . . . . . . . . . . 50
1.1.8 white (pink reflection). . . . . . . . . . . . . . . . . 51
1.1.9 white (beige reflection) . . . . . . . . . . . . . . . . 53
1.1.10 white (brown reflection) . . . . . . . . . . . . . . . . 63
1.1.11 white (grey reflection). . . . . . . . . . . . . . . . . 64
1.1.12 mixture of particles . . . . . . . . . . . . . . . . . . 69

1.2 ivory . . . . . . . . . . . . . . . . . . . . . . . . . . . 70

1.2.1 ivory (green tone) . . . . . . . . . . . . . . . . . . . 73
1.2.2 ivory (yellow tone). . . . . . . . . . . . . . . . . . . 74
1.2.3 ivory (orange tone) . . . . . . . . . . . . . . . . . . . 75
1.2.4 ivory (beige tone) . . . . . . . . . . . . . . . . . . . 75

1.3 cream . . . . . . . . . . . . . . . . . . . . . . . . . . . 76

1.3.1 mixture of particles . . . . . . . . . . . . . . . . . . 88
1.3.2 cream (yellow tone). . . . . . . . . . . . . . . . . . . 88
1.3.2.1 mixture of particles . . . . . . . . . . . . 90
1.3.2.2 yellowish cream (green tone) . . . . . . . . 91
1.3.2.3 yellowish cream (orange tone) . . . . . . . . 91
1.3.2.4 yellowish cream (grey tone) . . . . . . . . . 93
1.3.3 cream (orange tone). . . . . . . . . . . . . . . . . . . 93
1.3.3.1 cream (orange tone and green reflection). . . 96
1.3.4 cream (green tone) . . . . . . . . . . . . . . . . . . . 96
1.3.4.1 mixture of particles . . . . . . . . . . . . 97
1.3.4.2 cream (green and grey tones). . . . . . . . . 97
1.3.5 cream (beige tone) . . . . . . . . . . . . . . . . . . . 98
1.3.5.1 cream (beige and green tones) . . . . . . . . 99
1.3.6 cream (brown tone) . . . . . . . . . . . . . . . . . . . 99
1.3.7 cream (grey tone) . . . . . . . . . . . . . . . . . . . 100
1.3.7.1 mixture of particles . . . . . . . . . . . . 102
1.3.7.2 greyish cream (green tone). . . . . . . . . . 102
1.3.7.3 greyish cream (yellow tone) . . . . . . . . . 103
1.3.7.4 greyish cream (brown tone). . . . . . . . . . 104

Page

2.0 LILAC 2.1 lilac . . . . . . . . . . . . . . . . . . . . . . . . . . 105

2.1.1 lilac (pink tone). . . . . . . . . . . . . . . . . . . . 107
2.1.1.1 pinkish lilac (grey tone) . . . . . . . . . . . 108
2.1.2 lilac (red tone) . . . . . . . . . . . . . . . . . . . 109
2.1.3 lilac (beige tone) . . . . . . . . . . . . . . . . . . 110
2.1.4 lilac (grey tone) . . . . . . . . . . . . . . . . . . 111
2.1.5 mixture of particles . . . . . . . . . . . . . . . . 112

3.0 VIOLET 3.1 violet . . . . . . . . . . . . . . . . . . . . . . . . . 114

3.1.1 violet (pink tone) . . . . . . . . . . . . . . . . . . 121
3.1.2 violet (red tone) . . . . . . . . . . . . . . . . . . 122
3.1.3 violet (crimson tone) . . . . . . . . . . . . . . . 128
3.1.3.1 crimson-violet (amber tone) . . . . . . . . 130
3.1.4 brownish violet . . . . . . . . . . . . . . . . . . 130
3.1.5 greyish violet . . . . . . . . . . . . . . . . . . 131
3.1.6 mixture of particles . . . . . . . . . . . . . . . 132

4.0 VIOLET (BLUE TONE)

4.1 violet (blue tone). . . . . . . . . . . . . . . . . . . . . 133
4.1.1 blue-violet (red tone) . . . . . . . . . . . . . . 134
4.1.2 blue-violet (grey tone) . . . . . . . . . . . . . . 134

5.0 BLUE (VIOLET TONE)

5.1 blue (mauve tone) . . . . . . . . . . . . . . . . . . . . . 136
5.2 blue (violet tone). . . . . . . . . . . . . . . . . . . . . 137
5.2.1 violet-blue (crimson tone) . . . . . . . . . . . . . 140
5.2.2 violet-blue (red tone) . . . . . . . . . . . . . . 140

6.0 BLUE 6.1 blue . . . . . . . . . . . . . . . . . . . . . . . . . . 141
6.1.1 mixture of particles . . . . . . . . . . . . . . . . 149
6.2 indigo-blue . . . . . . . . . . . . . . . . . . . . . . . . 150
6.2.1 indigo-blue (grey tone). . . . . . . . . . . . . . . 154
6.3 cobalt-blue . . . . . . . . . . . . . . . . . . . . . . . . 154
6.4 azurite-blue . . . . . . . . . . . . . . . . . . . . . . . 156
6.5 prussian-blue . . . . . . . . . . . . . . . . . . . . . . 156
6.6 lapis lazuli-blue or ultramarine-blue . . . . . . . . . . . 156

Page 6.6.1 lapis lazuli or ultramarine-blue (violet tone) . . . 157
6.6.2 lapis lazuli or ultramarine-blue (red tone) . . . . 158
6.6.3 lapis lazuli or ultramarine-blue (grey tone) . . . . 158
6.7 azure-blue. . . . . . . . . . . . . . . . . . . . . . . 159
6.6.1 mixture of particles . . . . . . . . . . . . . . . 166
6.8 blue [between azure-blue and bluish turquoise] . . . . . . 167
6.9 royal-blue . . . . . . . . . . . . . . . . . . . . . . 167
6.9.1 royal-blue (violet tone) . . . . . . . . . . . . . . 169
6.9.2 royal-blue (green tone). . . . . . . . . . . . . . . 169
6.10 emerald-blue . . . . . . . . . . . . . . . . . . . . . 170
6.11 phtalo-blue . . . . . . . . . . . . . . . . . . . . . 171
6.12 blue (grey tone). . . . . . . . . . . . . . . . . . . . 173
6.12.1 greyish blue (green tone) . . . . . . . . . . . . . 176

7.0 <u>BLUE (GREEN TONE)</u>

7.1 bluish turquoise . . . . . . . . . . . . . . . . . . . . 177
7.1.1 bluish turquoise (grey tone) . . . . . . . . . . . . 183
7.2 blue (green tone) . . . . . . . . . . . . . . . . . . . 183
7.3 peacock-blue . . . . . . . . . . . . . . . . . . . . . 193
7.3.1 peacock-blue (grey tone) . . . . . . . . . . . . . . 195

8.0 <u>GREEN (BLUE TONE)</u>

8.1 green (blue tone) . . . . . . . . . . . . . . . . . . . 197
8.1.1 mixture of particles . . . . . . . . . . . . . . . 206
8.1.2 bluish green (brown tone). . . . . . . . . . . . . . 207
8.1.3 bluish green (grey tone) . . . . . . . . . . . . . . 207
8.2 greenish turquoise . . . . . . . . . . . . . . . . . . 208
8.2.1 mixture of particles . . . . . . . . . . . . . . . 222
8.2.2 greenish turquoise (greyish beige tone). . . . . . . 223
8.2.3 greenish turquoise (brown tone). . . . . . . . . . . 223
8.2.4 greenish turquoise (grey tone) . . . . . . . . . . . 224
8.2.5 mossy greenish turquoise . . . . . . . . . . . . . . 225

9.0 <u>GREEN</u>

9.1 green . . . . . . . . . . . . . . . . . . . . . . . . . 227
9.1.1 mixture of particles . . . . . . . . . . . . . . . . 253
9.2 pearly green . . . . . . . . . . . . . . . . . . . . . 257
9.3 mint-green . . . . . . . . . . . . . . . . . . . . . . 257
9.3.1 mint-green (blue tone) . . . . . . . . . . . . . . . 265
9.3.2 mint-green (yellow tone) . . . . . . . . . . . . . . 265
9.3.3 mint-green (brown tone). . . . . . . . . . . . . . . 266
9.3.4 mint-green (grey tone) . . . . . . . . . . . . . . . 267
9.4 mint-green (malachite-green type) . . . . . . . . . . . . 268
9.5 evergreen . . . . . . . . . . . . . . . . . . . . . . . 269
9.5.1 evergreen (blue tone) . . . . . . . . . . . . . . . 270

Page 9.5.2 evergreen (yellow tone) . . . . . . . . . . . . . . . 271
9.5.3 evergreen (brown tone) . . . . . . . . . . . . . . . . 271
9.5.4 evergreen (grey tone) . . . . . . . . . . . . . . . . 272
9.5.4.1 evergreen (grey and yellow tones) . . . . . 272
9.5.4.2 evergreen (grey and brown tones) . . . . . 272
9.6 phtalo-green . . . . . . . . . . . . . . . . . . . . . . 273
9.6.1 mixture of particles . . . . . . . . . . . . . . . 278
9.6.2 phtalo-green (mint-green tone) . . . . . . . . . . . 278
9.6.3 phtalo-green (beige tone) . . . . . . . . . . . . . 279
9.6.4 phtalo-green (brown tone) . . . . . . . . . . . . . 279
9.7 green [between phtalo-green and olive-green] . . . . . . . 279
9.8 grass-green . . . . . . . . . . . . . . . . . . . . . . . 280
9.8.1 mixture of particles . . . . . . . . . . . . . . . 308
9.8.2 grass-green (blue tone) . . . . . . . . . . . . . . 309
9.8.3 grass-green (yellow tone). . . . . . . . . . . . . . 316
9.8.4 grass-green (beige tone) . . . . . . . . . . . . . . 319
9.8.5 grass-green (brown tone) . . . . . . . . . . . . . . 320
9.8.6 grass-green (grey tone) . . . . . . . . . . . . . . 323
9.9 green [between grass-green and Paris green] . . . . . . . . 325
9.10 mossy grass-green . . . . . . . . . . . . . . . . . . . . 325
9.11 green [between grass-green and mint-green] . . . . . . . . 326
9.12 emerald-green . . . . . . . . . . . . . . . . . . . . . . 327
9.12.1 mixture of particles . . . . . . . . . . . . . . . . 340
9.12.2 emerald-green (blue tone). . . . . . . . . . . . . . 340
9.12.3 emerald-green (brown tone) . . . . . . . . . . . . . 343
9.13 green (orange tone) . . . . . . . . . . . . . . . . . . . 343
9.14 khaki-green . . . . . . . . . . . . . . . . . . . . . . . 344
9.14.1 mixture of particles . . . . . . . . . . . . . . . 349
9.14.2 khaki-green (yellow tone) . . . . . . . . . . . . . 350
9.14.3 khaki-green (orange tone) . . . . . . . . . . . . . 350
9.14.4 khaki-green (brown tone). . . . . . . . . . . . . . 350
9.14.4.1 brownish khaki-green (orange tone). . . . 352
9.14.4.2 khaki-green (greyish brown tone). . . . . 353
9.14.5 khaki-green (grey tone) . . . . . . . . . . . . . . 353
9.15 green (beige tone) . . . . . . . . . . . . . . . . . . . 354
9.16 green (brown tone) . . . . . . . . . . . . . . . . . . . 356
9.16.1 brownish green (yellow tone) . . . . . . . . . . . 361
9.16.2 brownish green (orange tone) . . . . . . . . . . . 362
9.16.3 brownish green (amber tone). . . . . . . . . . . . 362
9.16.4 mossy brownish green . . . . . . . . . . . . . . . 362
9.16.5 brownish green (grey tone) . . . . . . . . . . . . 363
9.17 mossy green . . . . . . . . . . . . . . . . . . . . . . 363
9.17.1 mixture of particles . . . . . . . . . . . . . . . 367
9.17.2 mossy green (blue tone). . . . . . . . . . . . . . 367
9.18 lichen-green . . . . . . . . . . . . . . . . . . . . . . 367
9.19 pearly green [between lichen-green and olive-green] . . . 368
9.20 green (grey tone) . . . . . . . . . . . . . . . . . . . 369
9.20.1 mixture of particles . . . . . . . . . . . . . . . 374
9.20.2 greyish green (yellow tone). . . . . . . . . . . . 375
9.20.3 greyish green (orange tone). . . . . . . . . . . . 376
9.20.4 greyish green (brown tone) . . . . . . . . . . . . 376
9.21 blackish green . . . . . . . . . . . . . . . . . . . . . 376
9.21.1 blackish green (brown tone). . . . . . . . . . . . 378
9.21.2 blackish green (grey tone) . . . . . . . . . . . . 379

Page

10.0 GREEN (YELLOW TONE)

10.1 olive-green. . . . . . . . . . . . . . . . . . . . . . . . 380
10.1.1 mixture of particles . . . . . . . . . . . . . . . . 404
10.1.2 olive-green (mint-green tone). . . . . . . . . . . . 405
10.1.3 olive-green (yellow tone). . . . . . . . . . . . . . 405
10.1.4 olive-green (orange tone). . . . . . . . . . . . . . 410
10.1.5 olive-green (amber tone) . . . . . . . . . . . . . . 410
10.1.6 olive-green (brown tone) . . . . . . . . . . . . . . 411
10.1.7 olive-green (grey tone). . . . . . . . . . . . . . . 414
10.2 pearly green [between olive-green and lichen-green] . . . 415
10.3 green [between olive-green and phtalo-green] . . . . . . . 415
10.4 green [between olive-green and apple-green] . . . . . . . 416
10.5 mossy olive-green . . . . . . . . . . . . . . . . . . . . 416
10.6 lime-green . . . . . . . . . . . . . . . . . . . . . . . . 421
10.7 apple-green . . . . . . . . . . . . . . . . . . . . . . . 421
10.7.1 mixture of particles . . . . . . . . . . . . . . . . 450
10.7.2 apple-green (yellow tone). . . . . . . . . . . . . . 452
10.7.2.1 apple-green (yellow tone and orange reflection) . . . . . . . . . . . . . 457 456
10.7.3 apple-green (orange tone). . . . . . . . . . . . . 457
10.7.4 apple-green (beige tone) . . . . . . . . . . . . . . 458
10.7.5 apple-green (brown tone) . . . . . . . . . . . . . . 458
10.7.6 apple-green (grey tone). . . . . . . . . . . . . . . 459
10.8 green [between apple-green and mint-green] . . . . . . . . 459
10.9 green [between apple-green and Paris green] . . . . . . . 460
10.10 yellowish green . . . . . . . . . . . . . . . . . . . . . 460
10.10.1 green (honey-yellow tone) . . . . . . . . . . . . . 474
10.10.2 yellowish green (orange tone) . . . . . . . . . . . 474
10.10.3 yellowish green (brown tone) . . . . . . . . . . . 475
10.10.4 yellowish green (grey tone) . . . . . . . . . . . . 476

11.0 GREENISH YELLOW 11.1 greenish yellow . . . . . . . . . . . . . . . . . . . . . 477
11.2 mixture of particles . . . . . . . . . . . . . . . . . . . 494
11.3 greenish yellow (orange tone) . . . . . . . . . . . . . . 493
11.4 greenish yellow (brown tone) . . . . . . . . . . . . . . . 494
11.5 greenish yellow (grey tone). . . . . . . . . . . . . . . . 494

12.0 YELLOW 12.1 yellow (ivory tone). . . . . . . . . . . . . . . . . . . . 495
12.2 creamy yellow . . . . . . . . . . . . . . . . . . . . . . 495
12.2.1 mixture of particles . . . . . . . . . . . . . . . . 501
12.2.2 creamy yellow (green tone) . . . . . . . . . . . . . 503
12.2.2.1 creamy greenish yellow (orange tone) . . 504
12.2.3 creamy yellow (orange tone) . . . . . . . . . . . . 504
12.2.4 creamy yellow (beige tone) . . . . . . . . . . . . . 504

Page 12.3 Naples yellow . . . . . . . . . . . . . . . . . . . . . . 505
12.3.1 Naples yellow (green tone) . . . . . . . . . . . . . 508
12.3.1.1 greenish Naples yellow (pinkish orange tone) . . . . . . . . . . . . . . . . . 509
12.3.2 Naples yellow (orange tone) . . . . . . . . . . . 510
12.3.3 Naples yellow (beige tone) . . . . . . . . . . . . 510
12.3.4 Naples yellow (grey tone) . . . . . . . . . . . . 510
12.4 yellow . . . . . . . . . . . . . . . . . . . . . . . . . . 511
12.4.1 mixture of particles . . . . . . . . . . . . . . . . 530
12.5 canary-yellow . . . . . . . . . . . . . . . . . . . . . . 530
12.6 lemon-yellow . . . . . . . . . . . . . . . . . . . . . . . 531
12.6.1 lemon-yellow (green tone). . . . . . . . . . . . . . 541
12.6.2 lemon-yellow (beige tone). . . . . . . . . . . . . . 542
12.7 yolk-yellow . . . . . . . . . . . . . . . . . . . . . . . 543
12.7.1 yolk-yellow (green tone) . . . . . . . . . . . . . 545
12.8 daisy-yellow . . . . . . . . . . . . . . . . . . . . . . . 546
12.9 sunny yellow [sunflower] . . . . . . . . . . . . . . . . . 546
12.9.1 sunny yellow (green tone). . . . . . . . . . . . . . 547
12.9.2 sunny yellow (orange tone) . . . . . . . . . . . . 547
12.10 golden yellow . . . . . . . . . . . . . . . . . . . . . . 547
12.10.1 golden yellow (orange tone). . . . . . . . . . . . 548
12.10.2 golden yellow (brown tone) . . . . . . . . . . . . 549
12.10.3 golden yellow (grey tone). . . . . . . . . . . . . 549
12.11 straw-yellow . . . . . . . . . . . . . . . . . . . . . . 550
12.11.1 straw-yellow (green tone). . . . . . . . . . . . . 550
12.12 yellow ochre . . . . . . . . . . . . . . . . . . . . . . 551
12.12.1 yellow ochre (green tone) . . . . . . . . . . . . 564
12.12.2 yellow ochre (orange tone) . . . . . . . . . . . . 567
12.12.2.1 orange-yellow ochre (green tone) . . 567
12.12.3 yellow ochre (beige tone) . . . . . . . . . . . . 567
12.12.3.1 yellow ochre (beige tone and green reflection) . . . . . . . . . . . . . 570
12.12.4 yellow ochre (brown tone) . . . . . . . . . . . . 570
12.12.4.1 yellow ochre (greenish brown tone) . . 571
12.13 honey-yellow . . . . . . . . . . . . . . . . . . . . . . 571
12.13.1 mixture of particles . . . . . . . . . . . . . . . 574
12.14 yellow (beige tone) . . . . . . . . . . . . . . . . . . . 575
12.14.1 yellow (beige tone and pink reflection). . . . . . 577
12.15 bronze-yellow . . . . . . . . . . . . . . . . . . . . . . 577
12.16 yellow (brown tone) . . . . . . . . . . . . . . . . . . . 577
12.16.1 brownish yellow (green tone) . . . . . . . . . . . 579
12.17 yellow (grey tone). . . . . . . . . . . . . . . . . . . . 579

13.0 YELLOW (ORANGE TONE)

13.1 yellow (orange tone) . . . . . . . . . . . . . . . . . . . 581
13.1.1 mixture of particles . . . . . . . . . . . . . . . . 591
13.1.2 yellow (orange tone and green reflection). . . . . 592
13.1.2.1 orange-yellow (greyish green tone) . . . 592
13.1.3 orange-yellow (pink tone). . . . . . . . . . . . . 592
13.1.4 orange-yellow (beige tone) . . . . . . . . . . . . 592
13.1.5 orange-yellow (brown tone) . . . . . . . . . . . . 593
13.1.6 orange-yellow (grey tone) . . . . . . . . . . . . 594
13.2 yellow (copper tone) . . . . . . . . . . . . . . . . . . . 594

Page

14.0 ORANGE (YELLOW TONE)

14.1 orange (yellow tone) . . . . . . . . . . . . . . . . . . . . 596

15.0 ORANGE 15.1 orange (lilac tone) . . . . . . . . . . . . . . . . . . . . 598
15.2 orange (green tone). . . . . . . . . . . . . . . . . . . . 598
15.2.1 mixture of particles . . . . . . . . . . . . . . . . 601
15.3 orange . . . . . . . . . . . . . . . . . . . . . . . . 601
15.3.1 mixture of particles . . . . . . . . . . . . . . . . 641
15.4 rusty orange . . . . . . . . . . . . . . . . . . . . . 644
15.4.1 mixture of particles . . . . . . . . . . . . . . . . 665
15.4.2 rusty orange (green tone) . . . . . . . . . . . . . 666
15.4.3 rusty orange (pink tone) . . . . . . . . . . . . . 667
15.4.4 rusty orange (red tone). . . . . . . . . . . . . . 667
15.4.5 rusty orange (burnt tone) . . . . . . . . . . . . . 670
15.4.6 rusty orange (brown tone) . . . . . . . . . . . . . 670
15.5 brick-orange . . . . . . . . . . . . . . . . . . . . . 675
15.6 burnt orange . . . . . . . . . . . . . . . . . . . . . 678
15.6.1 burnt orange (yellow tone) . . . . . . . . . . . . 681
15.6.2 burnt orange (brown tone). . . . . . . . . . . . . 681
15.7 caramel-orange . . . . . . . . . . . . . . . . . . . . 682
15.7.1 caramel-orange (green tone) . . . . . . . . . . . 683
15.7.2 caramel-orange (red tone) . . . . . . . . . . . . 683
15.7.3 caramel-orange (brown tone) . . . . . . . . . . . 684
15.8 orange (amer tone) . . . . . . . . . . . . . . . . . . 684
15.9 orange ochre . . . . . . . . . . . . . . . . . . . . . 685
15.10 orange (chamois tone). . . . . . . . . . . . . . . . . 685
15.11 orange (beige tone). . . . . . . . . . . . . . . . . . 686
15.12 orange (brown tone). . . . . . . . . . . . . . . . . . 695
15.12.1 mixture of particles . . . . . . . . . . . . . . . 712
15.12.2 brownish orange (green tone). . . . . . . . . . . 712
15.12.3 brownish orange (yellow tone) . . . . . . . . . . 713
15.12.4 brownish orange (pink tone) . . . . . . . . . . . 714
15.12.5 brownish orange (red tone). . . . . . . . . . . . 714

16.0 ORANGE (PINK TONE)

16.1 orange (salmon tone) . . . . . . . . . . . . . . . . . . 715
16.2 orange (pink tone) or pinkish orange . . . . . . . . . . . 715
16.3 orange (copper tone) . . . . . . . . . . . . . . . . . . 718
16.4 orange (red tone) or reddish orange . . . . . . . . . . . 719
16.4.1 mixture of particles . . . . . . . . . . . . . . . 724
16.4.2 reddish orange (violet tone) . . . . . . . . . . . 725
16.4.3 reddish orange (brown tone) . . . . . . . . . . . 725
16.5 reddish orange (rusty tone). . . . . . . . . . . . . . . 726
16.6 orange ochre (red tone) or reddish orange ochre . . . . . 727
16.7 orange (brick-red tone) . . . . . . . . . . . . . . . . . 727

Page

17.0 PINK (ORANGE TONE)

17.1 pink (orange tone) . . . . . . . . . . 729
17.1.1 orange-pink (beige tone) . . . . . . . . . . 731
17.1.2 orange-pink (brown tone) . . . . . . . . . . 732
17.2 salmon . . . . . . . . . . 732
17.2.1 salmon (brown tone). . . . . . . . . . 735

18.0 PINK 18.1 pink (lilac tone). . . . . . . . . . 737
18.1.2 lilac-pink (orange tone) . . . . . . . . . . 737
18.2 pink (violet tone) . . . . . . . . . . 738
18.2.1 mixture of particles . . . . . . . . . . 740
18.3 pink (crimson-tone) . . . . . . . . . . 741
18.4 pink (lees wine coloured tone) . . . . . . . . . . 741
18.4.1 pink (brownish lees wine coloured tone). . . . . . 741
18.5 pearly pink . . . . . . . . . . 742
18.5.1 pearly pink (copper tone). . . . . . . . . . 743
18.5.2 pearly pink (brown tone) . . . . . . . . . . 743
18.6 pink (yellow tone) . . . . . . . . . . 744
18.7 pink . . . . . . . . . . 745
18.7.1 mixture of particles . . . . . . . . . . 752
18.8 candy pink . . . . . . . . . . 753
18.9 pink (chamois tone). . . . . . . . . . 754
18.10 pink (beige tone). . . . . . . . . . 754
18.11 pink (brown tone). . . . . . . . . . 757
18.11.1 mixture of particles . . . . . . . . . . 758
18.12 old rose . . . . . . . . . . 759
18.12.1 old rose (lilac tone) . . . . . . . . . . 761
18.12.2 old rose (orange tone) . . . . . . . . . . 762
18.12.2.1 old rose (pinkish orange tone) . . . . 762
18.12.3 old rose (beige tone) . . . . . . . . . . 762
18.12.4 old rose (brown tone) . . . . . . . . . . 763
18.12.5 old rose (grey tone) . . . . . . . . . . 763
18.13 pink (grey tone) . . . . . . . . . . 764

19.0 PINK (RED TONE)

19.1 pink (red tone) . . . . . . . . . . 766
19.2 Burgundy-pink (brown tone) . . . . . . . . . . 767

20.0 RED (PINK TONE)

20.1 red (pink tone) . . . . . . . . . . 768

Pagı

21.0 RED

21.1 indian red . . . . . . . . . . . . . . . . . . . . . . . . . 769
21.1.1 indian red (violet tone) . . . . . . . . . . . . . . 770
21.2 lees wine coloured . . . . . . . . . . . . . . . . . . . . . 770
21.2.1 lees wine coloured (brown tone). . . . . . . . . . . 770
21.3 red (golden tone). . . . . . . . . . . . . . . . . . . . . . 771
21.4 red (orange tone). . . . . . . . . . . . . . . . . . . . . . 771
21.4.1 red (rusty orange tone) . . . . . . . . . . . . . . 775
21.4.2 orange-red (brown tone) . . . . . . . . . . . . . . 776
21.5 red . . . . . . . . . . . . . . . . . . . . . . . . . . . . 777
21.6 Burgundy-red . . . . . . . . . . . . . . . . . . . . . . . . 777
21.6.1 Burgundy-red (brown tone) . . . . . . . . . . . . . 779
21.7 red ochre . . . . . . . . . . . . . . . . . . . . . . . . . 780

22.0 RED (BROWN TONE)

22.1 red chestnut . . . . . . . . . . . . . . . . . . . . . . . . 781
22.2 red (brown tone) . . . . . . . . . . . . . . . . . . . . . . 781
22.2.1 brownish red (crimson tone) . . . . . . . . . . . . 791
22.2.2 brownish red (orange tone) . . . . . . . . . . . . . 792

23.0 BEIGE (PINK TONE)

23.1 beige-flesh . . . . . . . . . . . . . . . . . . . . . . . . 794
23.1.1 beige-flesh (pinkish lilac tone) . . . . . . . . . . 794
23.1.2 beige-flesh (salmon tone) . . . . . . . . . . . . . 794
23.2 beige (pink tone). . . . . . . . . . . . . . . . . . . . . . 795
23.2.1 mixture of particles . . . . . . . . . . . . . . . . 825
23.2.2 beige (pink-lilac tone). . . . . . . . . . . . . . . 825
23.2.3 beige (pink-violet tone) . . . . . . . . . . . . . . 826
23.2.4 beige (orange-pink tone) . . . . . . . . . . . . . . 826
23.2.4.1 mixture of particles . . . . . . . . . . . 835
23.2.5 brownish beige (orange-pink tone) . . . . . . . . . 836
23.3 beige (salmon tone) . . . . . . . . . . . . . . . . . . . . 836
23.3.1 salmon-beige (brown tone). . . . . . . . . . . . . . 837
23.4 pinkish beige (brown tone) . . . . . . . . . . . . . . . . . 837
23.5 pinkish beige (grey tone). . . . . . . . . . . . . . . . . . 838

24.0 BEIGE (RED TONE)

24.1 reddish beige . . . . . . . . . . . . . . . . . . . . . . . 843
24.2 copper-beige (orange-pink tone) . . . . . . . . . . . . . . 843

Page

25.0 BEIGE

| | |
|---|---|
| 25.1 beige (lilac tone) | 845 |
| 25.2 beige (violet tone) | 845 |
| 25.3 beige (blue tone) | 845 |
| 25.4 beige (green tone) | 846 |
| 25.4.1 mixture of particles | 857 |
| 25.4.2 beige (greyish green tone) | 858 |
| 25.4.3 beige (khaki-green tone) | 858 |
| 25.5 chamois | 859 |
| 25.5.1 chamois (yellow tone) | 867 |
| 25.5.2 chamois (orange tone) | 868 |
| 25.5.2.1 mixture of particles | 873 |
| 25.5.2.2 chamois (pink-orange tone) | 873 |
| 25.5.3 chamois (pink tone) | 874 |
| 25.5.3.1 chamois (orange-pink tone) | 877 |
| 25.5.4 chamois (beige tone) | 879 |
| 25.5.5 chamois (brown tone) | 879 |
| 25.5.6 chamois (grey tone) | 880 |
| 25.6 ivory-beige | 881 |
| 25.7 creamy beige | 881 |
| 25.7.1 creamy beige (green tone) | 885 |
| 25.7.2 creamy beige (orange-pink tone) | 885 |
| 25.7.3 mixture of particles | 886 |
| 25.8 beige (yellow tone) | 886 |
| 25.8.1 beige (golden yellow tone) | 896 |
| 25.8.2 beige (honey-yellow tone) | 896 |
| 25.8.3 beige (straw-yellow tone) | 896 |
| 25.8.4 yellowish beige (green tone) | 896 |
| 25.8.5 beige (orange-yellow tone) | 897 |
| 25.8.6 yellowish beige (green-grey tone) | 897 |
| 25.9 beige (orange tone) | 898 |
| 25.9.1 mixture of particles | 955 |
| 25.9.2 greenish orange-beige | 957 |
| 25.9.3 yellowish orange-beige | 958 |
| 25.9.4 pinkish orange-beige | 959 |
| 25.9.4.1 pinkish orange-beige (brown tone) | 966 |
| 25.9.5 reddish orange-beige | 967 |
| 25.9.6 greyish orange-beige | 967 |
| 25.9.6.1 orange-beige (pinkish grey tone) | 968 |
| 25.9.7 rusty orange-beige | 968 |
| 25.9.7.1 mixture of particles | 969 |
| 25.9.8 beige (orange-copper tone) | 969 |
| 25.9.9 caramel-beige (orange tone) | 970 |
| 25.9.9.1 caramel-beige (pinkish orange tone) | 971 |
| 25.10 beige | 971 |
| 25.10.1 mixture of particles | 1058 |
| 25.11 beige ochre | 1071 |
| 25.12 greyish beige | 1072 |
| 25.12.1 mixture of particles | 1109 |
| 25.12.2 greyish beige (lilac tone) | 1110 |
| 25.12.3 greyish beige (pinkish violet tone) | 1111 |
| 25.12.4 greyish beige (blue tone) | 1111 |
| 25.12.5 greyish beige (green tone) | 1112 |

Page 25.12.6 greyish beige (green tone). . . . . . . . . . . . 1112
25.12.6.1 greyish beige (yellow tone) . . . . . 1117
25.12.6.2 greyish beige (greenish yellow tone) . 1118
25.12.7 greyish beige (orange tone) . . . . . . . . . . . 1119
25.12.7.1 greyish beige (greenish orange tone) . 1126
25.12.7.2 greyish beige (pinkish orange tone). . 1126
25.12.7.3 greyish beige (reddish orange tone). . 1127
25.12.7.3.1 mixture of particles . . 1128
25.12.7.4 greyish beige (brownish orange tone) . 1128
25.12.8 greyish beige (pink tone) . . . . . . . . . . . . 1129
25.12.8.1 greyish beige (orange-pink tone) . . . 1134

26.0 BEIGE (BROWN TONE)

26.1 brownish beige . . . . . . . . . . . . . . . . . . . . . . . 1137
26.1.1 mixture of particles . . . . . . . . . . . . . . . . 1155
26.1.2 brownish beige (greenish blue tone) . . . . . . . 1155
26.1.3 brownish beige (green tone). . . . . . . . . . . . 1156
26.1.4 brownish beige (orange tone) . . . . . . . . . . . 1157
26.1.5 brownish beige (pink tone) . . . . . . . . . . . . 1160
26.1.5.1 brownish beige (orange-pink tone). . . . 1165
26.1.6 brownish beige (copper tone) . . . . . . . . . . . 1166
26.1.7 brownish beige (grey tone) . . . . . . . . . . . . 1167
26.1.7.1 brownish beige (grey and pink tones) . . 1170

27.0 BROWN (BEIGE TONE)

27.1 brown (chamois tone) . . . . . . . . . . . . . . . . . . . . 1172
27.2 brown (beige tone) . . . . . . . . . . . . . . . . . . . . . 1173

28.0 BROWN

28.1 brown (violet tone). . . . . . . . . . . . . . . . . . . . . 1174
28.1.1 violet-brown (red tone) . . . . . . . . . . . . . . 1179
28.1.2 violet-brown (grey tone) . . . . . . . . . . . . . 1180
28.2 caput-mortuum . . . . . . . . . . . . . . . . . . . . . . . 1180
28.2.1 caput-mortuum (violet tone) . . . . . . . . . . . 1181
28.2.1.1 caput-mortuum (crimson-violet tone). . . 1182
28.2.1.2 caput-mortuum (pinkish violet tone). . . 1182
28.2.1.3 caput-mortuum (reddish violet tone). . . 1182
28.2.2 caput-mortuum (pinkish lilac tone) . . . . . . . . 1183
28.2.2.1 caput-mortuum (reddish lilac tone) . . . 1183
28.2.3 caput-mortuum (pink tone). . . . . . . . . . . . . 1184
28.2.3.1 caput-mortuum (violet-pink tone) . . . . 1184
28.2.4 caput-mortuum (red tone) . . . . . . . . . . . . . 1185
28.2.4.1 caput-mortuum (violet-red tone). . . . . 1185
28.2.5 caput-mortuum (brown tone) . . . . . . . . . . . . 1186
28.2.6 caput-mortuum (violet-grey tone) . . . . . . . . . 1187

Page 28.3 brown (green tone) . . . . . . . . . . . . . . . . . . . . . . 1187
28.3.1 mixture of particles . . . . . . . . . . . . . . . . 1193
28.3.2 brown (orange-green tone) . . . . . . . . . . . . 1194
28.3.3 brown (mint-green tone). . . . . . . . . . . . . . 1194
28.3.4 brown (evergreen tone) . . . . . . . . . . . . . . 1194
28.3.5 brown (olive-green tone) . . . . . . . . . . . . . 1195
28.4 khaki-brown . . . . . . . . . . . . . . . . . . . . . . . . 1196
28.4.1 khaki-brown (yellow tone). . . . . . . . . . . . . 1198
28.5 brown (yellow tone). . . . . . . . . . . . . . . . . . . . . 1198
28.5.1 brown (orange-yellow tone) . . . . . . . . . . . . 1200
28.6 golden brown . . . . . . . . . . . . . . . . . . . . . . . 1201
28.7 brown (orange tone). . . . . . . . . . . . . . . . . . . . . 1201
28.7.1 mixture of particles . . . . . . . . . . . . . . . . 1236
28.7.2 orange-brown (pinkish lilac tone). . . . . . . . . . 1237
28.7.3 orange-brown (green tone). . . . . . . . . . . . . . 1237
28.7.3.1 mixture of particles . . . . . . . . . . . 1238
28.7.4 orange-brown (yellow tone) . . . . . . . . . . . . . 1239
28.7.5 brown (pinkish orange tone). . . . . . . . . . . . . 1239
28.7.6 brown (reddish orange tone). . . . . . . . . . . . . 1241
28.7.7 orange-brown (caramel tone). . . . . . . . . . . . . 1248
28.7.8 orange-brown (grey tone) . . . . . . . . . . . . . . 1248
28.7.8.1 mixture of particles . . . . . . . . . . . 1249
28.8 rusty brown . . . . . . . . . . . . . . . . . . . . . . . . 1249
28.8.1 mixture of particles . . . . . . . . . . . . . . . . 1263
28.8.2 rusty brown (green tone) . . . . . . . . . . . . . . 1263
28.8.2.1 mixture of particles . . . . . . . . . . . 1263
28.8.3 rusty brown (greenish yellow tone) . . . . . . . . . 1264
28.8.4 rusty brown (orange tone) . . . . . . . . . . . . . 1264
28.8.5 rusty brown (red tone) . . . . . . . . . . . . . . . 1265
28.9 russet-brown . . . . . . . . . . . . . . . . . . . . . . . . 1266
28.10 caramel-brown . . . . . . . . . . . . . . . . . . . . . . . 1267
28.10.1 caramel-brown (blue tone) . . . . . . . . . . . . . 1271
28.10.2 caramel-brown (green tone). . . . . . . . . . . . . 1272
28.10.2.1 caramel-brown (green and grey tones) . 1273
28.10.3 caramel-brown (greenish yellow tone). . . . . . . 1273
28.10.3.1 caramel-brown (orange-yellow tone and green reflection) . . . . . . . . . . 1274
28.10.4 caramel-brown (orange tone) . . . . . . . . . . . 1274
28.10.4.1 caramel-brown (greenish orange tone) . 1276
28.10.4.2 orange caramel-brown (violet-pink tone) 1276
28.10.4.3 caramel-brown (reddish orange tone). . 1277
28.10.5 caramel-brown (pink tone) . . . . . . . . . . . . 1277
28.10.6 caramel-brown (red tone). . . . . . . . . . . . . 1278
28.10.7 caramel-brown (grey tone) . . . . . . . . . . . . 1278
28.11 amber-brown . . . . . . . . . . . . . . . . . . . . . . . . 1279
28.11.1 amber-brown (yellow tone) . . . . . . . . . . . . 1283
28.11.1.1 amber-brown (orange-yellow tone) . . . 1283
28.11.1.2 amber-brown (greenish orange-yellow tone) . . . . . . . . . . . . . . . . 1283
28.11.2 amber-brown (orange tone) . . . . . . . . . . . . 1284
28.11.3 amber-brown (pink tone) . . . . . . . . . . . . . 1286
28.11.3.1 amber-brown (violet-pink tone) . . . . 1286
28.11.3.2 amber-brown (orange-pink tone) . . . . 1287
28.11.4 amber-brown (red tone) . . . . . . . . . . . . . . 1287
28.11.4.1 amber-brown (red tone and blue reflection) . . . . . . . . . . . . . . 1288

Page 28.11.4.2 reddish amber-brown (yellow tone). . . 1288
28.11.4.3 amber-brown (orange-red tone) . . . . 1289
28.11.5 amber-brown (grey tone) . . . . . . . . . . . . . 1289
28.12 pinkish brown . . . . . . . . . . . . . . . . . . . . . 1290
28.12.1 mixture of particles . . . . . . . . . . . . . . 1298
28.12.2 brown (old rose tone) . . . . . . . . . . . . . . 1299
28.12.3 burnt umber (lilac-pink tone) . . . . . . . . . . 1300
28.12.4 pinkish brown (violet tone) . . . . . . . . . . . 1301
28.12.5 pinkish brown (crimson tone). . . . . . . . . . . 1302
28.12.6 orange-pink brown . . . . . . . . . . . . . . . . 1302
28.12.6.1 mixture of particles . . . . . . . . . 1304
28.12.7 pinkish brown (grey tone) . . . . . . . . . . . . 1305
28.13 reddish brown . . . . . . . . . . . . . . . . . . . . . 1306
28.13.1 mixture of particles . . . . . . . . . . . . . . 1339
28.13.2 brown (violet-red tone) . . . . . . . . . . . . . 1339
28.13.3 brown (crimson tone) . . . . . . . . . . . . . . 1347
28.13.4 brown (orange-red tone) . . . . . . . . . . . . . 1348
28.13.5 brown (brick-red tone) . . . . . . . . . . . . . 1354
28.13.6 brown (golden red tone) . . . . . . . . . . . . . 1354
28.13.7 brown (copper-red tone) . . . . . . . . . . . . . 1354
28.13.8 reddish brown (grey tone) . . . . . . . . . . . . 1355
28.14 chestnut-brown . . . . . . . . . . . . . . . . . . . . . 1356
28.15 shale-brown . . . . . . . . . . . . . . . . . . . . . . 1356
28.16 brown . . . . . . . . . . . . . . . . . . . . . . . . . 1357
28.16.1 mixture of particles . . . . . . . . . . . . . . 1413
28.17 brown ochre . . . . . . . . . . . . . . . . . . . . . . 1418
28.17.1 brown ochre (green tone). . . . . . . . . . . . . 1418
28.17.2 brown ochre (caramel tone). . . . . . . . . . . . 1419
28.17.2.1 brown ochre (caramel tone and green reflection) . . . . . . . . . . . . . . . . 1419
28.17.3 brown ochre (orange tone) . . . . . . . . . . . . 1420
28.17.3.1 brown ochre (reddish orange tone). . . 1420
28.17.4 brown ochre (rusty tone) . . . . . . . . . . . . 1421
28.17.5 brown ochre (red tone) . . . . . . . . . . . . . 1421
28.17.6 brown ochre (pink tone) . . . . . . . . . . . . . 1421
28.18 milky chocolate-brown . . . . . . . . . . . . . . . . . 1421
28.18.1 mixture of particles . . . . . . . . . . . . . . 1430
28.18.2 milky chocolate-brown (green tone). . . . . . . . 1432
28.18.3 milky chocolate-brown (yellow tone) . . . . . . . 1432
28.18.4 milky chocolate-brown (orange tone) . . . . . . . 1433
28.18.4.1 mixture of particles . . . . . . . . 1438
28.18.4.2 milky chocolate-brown (pinkish orange tone) . . . . . . . . . . . . . . . 1439
28.18.5 pinkish milky chocolate-brown . . . . . . . . . . 1440
28.18.5.1 milky chocolate-brown (orange-pink tone) 1445
28.18.6 milky chocolate-brown (red tone) . . . . . . . . 1446
28.18.7 milky chocolate-brown (grey tone) . . . . . . . . 1447
28.18.7.1 greyish milky chocolate-brown (lilac tone) . . . . . . . . . . . . . . . . . 1454
28.18.7.2 greyish milky chocolate-brown (orange tone) . . . . . . . . . . . . 1455
28.18.7.2.1 greyish milky chocolate-brown (pinkish orange tone) 1457
28.18.7.3 greyish milky chocolate-brown (pink tone) . . . . . . . . . . . . . . . . 1457

Page 28.18.7.3.1 greyish milky chocolate-brown (orange-pink tone). 1458
28.19 chocolate-brown . . . . . . . . . . . . . . . . . . . . 1458
28.19.1 mixture of particles . . . . . . . . . . . . . 1512
28.19.2 chocolate-brown (crimson tone) . . . . . . . . . 1514
28.19.3 chocolate-brown (green tone) . . . . . . . . . . 1514
28.19.4 chocolate-brown (orange-yellow tone) . . . . . . 1515
28.19.5 chocolate-brown (golden tone). . . . . . . . . . 1515
28.19.6 chocolate-brown (reddish amber tone) . . . . . . 1516
28.19.7 chocolate-brown (orange tone). . . . . . . . . . 1516
28.19.7.1 chocolate-brown (rusty orange tone) . 1524
28.19.7.2 chocolate-brown (reddish orange tone) 1526
28.19.8 chocolate-brown (pink tone). . . . . . . . . . . 1527
28.19.8.1 chocolate-brown (old rose tone) . . . 1529
28.19.9 chocolate-brown (red tone) . . . . . . . . . . . 1530
28.19.9.1 chocolate-brown (violet-red tone) . . 1537
28.19.9.2 chocolate-brown (orange-red tone) . . 1537
28.19.10 chocolate-brown (grey tone). . . . . . . . . . . 1538
28.19.10.1 greyish chocolate-brown (violet-pink tone) . . . . . . . . . . . . . . . 1543
28.19.10.2 greyish chocolate-brown (orange tone) 1544
28.19.11 mossy chocolate-brown . . . . . . . . . . . . . 1545
28.19.11.1 mossy chocolate-brown (orange tone). 1546
28.19.11.2 mossy chocolate-brown (pink tone). . 1546
28.19.11.2.1 mossy chocolate-brown (orange-pink tone) . . 1547
28.19.11.3 mossy chocolate-brown (ashen tone) . 1547
28.19.12 burnt umber . . . . . . . . . . . . . . . . . . 1547
28.19.12.1 burnt umber (caramel tone) . . . . . 1551

29.0 BROWN (GREY TONE)

29.1 greyish brown . . . . . . . . . . . . . . . . . . . . . . . 1553
29.1.1 greyish brown (violet tone). . . . . . . . . . . . . 1586
29.1.1.1 greyish brown (pinkish violet tone). . . 1588
29.1.2 greyish brown (crimson tone) . . . . . . . . . . . 1588
29.1.3 greyish brown (green tone) . . . . . . . . . . . . 1589
29.1.4 greyish brown (yellow tone). . . . . . . . . . . . 1591
29.1.5 greyish brown (orange tone). . . . . . . . . . . . 1592
29.1.5.1 greyish brown (pinkish orange tone). . . 1593
29.1.6 greyish brown (pink tone). . . . . . . . . . . . . 1594
29.1.6.1 greyish brown (pinkish deep purple tone) 1596
29.1.6.2 greyish brown (orange-pink tone) . . . . 1598
29.1.7 greyish brown (violet-red tone). . . . . . . . . . 1598
29.1.8 greyish brown (amber tone) . . . . . . . . . . . . 1599
29.1.9 greyish brown (caramel tone) . . . . . . . . . . . 1599

Page

30.0 GREY (BEIGE TONE)

30.1 creamy grey . . . . . . . . . . . . . . . . . . . . . . . . 1600
30.2 beige-grey . . . . . . . . . . . . . . . . . . . . . . . . . 1600
30.2.1 mixture of particles . . . . . . . . . . . . . . . 1619
30.2.2 beige-grey (green tone). . . . . . . . . . . . . . . 1619
30.2.3 beige-grey (yellow tone) . . . . . . . . . . . . . . 1621
30.2.4 pearly beige-grey (orange tone). . . . . . . . . . . 1622
30.2.5 beige-grey (pink tone) . . . . . . . . . . . . . . . 1622

31.0 GREY (BROWN TONE)

31.1 brown-grey . . . . . . . . . . . . . . . . . . . . . . . . 1626
31.1.1 mixture of particles . . . . . . . . . . . . . . . . 1686
31.1.2 brown-grey (violet tone) . . . . . . . . . . . . . . 1687
31.1.3 brown-grey (crimson tone). . . . . . . . . . . . . . 1688
31.1.4 brown-grey (blue tone) . . . . . . . . . . . . . . . 1689
31.1.5 brown-grey (green tone). . . . . . . . . . . . . . . 1690
31.1.6 brown-grey (yellow tone) . . . . . . . . . . . . . . 1694
31.1.6.1 brown-grey (green-yellow tone) . . . . . 1695
31.1.7 brown-grey (orange tone) . . . . . . . . . . . . . . 1696
31.1.8 amber-grey [or red-brown tone] . . . . . . . . . . . 1696
31.1.9 brown-grey (pink tone) . . . . . . . . . . . . . . . 1698
31.1.9.1 brown-grey (violet-pink tone). . . . . . 1699
31.1.10 brown-grey (red tone) . . . . . . . . . . . . . . . 1701

32.0 GREY 32.1 grey (lilac tone). . . . . . . . . . . . . . . . . . . . . 1703
32.1.1 lilac-grey (pink tone) . . . . . . . . . . . . . . . 1705
32.1.2 lilac-grey (brown tone). . . . . . . . . . . . . . . 1705
32.2 violet-grey . . . . . . . . . . . . . . . . . . . . . . . 1706
32.2.1 violet-grey (crimson tone) . . . . . . . . . . . . . 1709
32.2.2 violet-grey (red tone) . . . . . . . . . . . . . . . 1710
32.3 grey (blue tone) . . . . . . . . . . . . . . . . . . . . . 1710
32.3.1 mixture of particles . . . . . . . . . . . . . . . . 1716
32.3.2 blue-grey (green tone) . . . . . . . . . . . . . . . 1717
32.4 grey (green tone). . . . . . . . . . . . . . . . . . . . . 1717
32.4.1 grey (grass-green tone) . . . . . . . . . . . . . . . 1731
32.4.2 grey (olive-green tone). . . . . . . . . . . . . . . 1731
32.4.2.1 mixture of particles . . . . . . . . . . . 1732
32.4.3 green-grey (blue tone) . . . . . . . . . . . . . . . 1732
32.4.4 green-grey (yellow tone) . . . . . . . . . . . . . . 1733
32.4.5 green-grey (orange tone) . . . . . . . . . . . . . . 1733
32.4.6 green-grey (beige tone). . . . . . . . . . . . . . . 1733
32.4.7 green-grey (brown tone). . . . . . . . . . . . . . . 1734
32.5 grey (yellow tone) . . . . . . . . . . . . . . . . . . . . 1735
32.5.1 grey (green-yellow tone) . . . . . . . . . . . . . . 1739
32.6 grey (pink-tone) . . . . . . . . . . . . . . . . . . . . . 1740
32.6.1 grey (lilac-pink tone) . . . . . . . . . . . . . . . 1743
32.6.2 pink-grey (beige tone) . . . . . . . . . . . . . . . 1743
32.7 grey (red tone) . . . . . . . . . . . . . . . . . . . . . 1743
32.8 grey . . . . . . . . . . . . . . . . . . . . . . . . . . . 1744

Page 32.8.1 mixture of particles . . . . . . . . . . . . . . . . 1812
32.9 silver-grey . . . . . . . . . . . . . . . . . . . . . . . . 1814
32.10 metallic grey . . . . . . . . . . . . . . . . . . . . . . . 1814
32.10.1 metallic grey (blue tone) . . . . . . . . . . . . . 1820
32.10.2 metallic grey (brown tone) . . . . . . . . . . . . 1821
32.11 iron-grey. . . . . . . . . . . . . . . . . . . . . . . . . . 1822
32.11.1 mixture of particles . . . . . . . . . . . . . . . 1845
32.11.2 iron-grey (lilac tone). . . . . . . . . . . . . . . 1846
32.11.3 iron-grey (violet tone) . . . . . . . . . . . . . . 1847
32.11.4 iron-grey (blue tone) . . . . . . . . . . . . . . . 1847
32.11.4.1 mixture of particles . . . . . . . . . . 1848
32.11.5 iron-grey (green tone). . . . . . . . . . . . . . . 1849
32.11.6 iron-grey (pink tone) . . . . . . . . . . . . . . . 1849
32.11.7 iron-grey (red tone) . . . . . . . . . . . . . . . 1850
32.11.7.1 iron-grey (brownish red tone). . . . . 1851
32.11.8 iron-grey (beige tone). . . . . . . . . . . . . . . 1851
32.11.9 iron-grey (brown tone). . . . . . . . . . . . . . . 1851
32.11.9.1 iron-grey (violet-brown tone). . . . . 1857
32.11.9.2 iron-grey (pinkish brown tone) . . . . 1857
32.11.9.3 iron-grey (reddish brown tone) . . . . 1857
32.12 smoky grey . . . . . . . . . . . . . . . . . . . . . . . . 1858
32.12.1 mixture of particles . . . . . . . . . . . . . . . 1860
32.12.2 smoky grey (blue tone) . . . . . . . . . . . . . . 1860
32.12.3 smoky grey (green tone) . . . . . . . . . . . . . . 1861
32.12.4 smoky grey (amber tone) . . . . . . . . . . . . . . 1861
32.13 coal-grey . . . . . . . . . . . . . . . . . . . . . . . . . 1861
32.13.1 coal-grey (violet tone) . . . . . . . . . . . . . . 1861

33.0 BLACKISH GREY 33.1 blackish grey. . . . . . . . . . . . . . . . . . . . . . . . 1863

34.0 GREYISH BLACK 34.1 greyish black. . . . . . . . . . . . . . . . . . . . . . . . 1868

35.0 BLACK 35.1 black (blue tone). . . . . . . . . . . . . . . . . . . . . . 1870
35.1.1 black (greyish blue tone). . . . . . . . . . . . . . 1870
35.2 black (green tone) . . . . . . . . . . . . . . . . . . . . . 1871
35.3 black (rusty tone) . . . . . . . . . . . . . . . . . . . . . 1871
35.3 black (red tone) . . . . . . . . . . . . . . . . . . . . . . 1872
35.4 black (brown tone) . . . . . . . . . . . . . . . . . . . . . 1872
35.4.1 brown-black (violet tone). . . . . . . . . . . . . . 1876
35.5 smoky black . . . . . . . . . . . . . . . . . . . . . . . . 1876
35.6 soot-black . . . . . . . . . . . . . . . . . . . . . . . . . 1877
35.6.1 soot-black (green tone). . . . . . . . . . . . . . . 1878
35.6.2 soot-black (brown tone). . . . . . . . . . . . . . . 1878
35.7 black . . . . . . . . . . . . . . . . . . . . . . . . . . . 1878
35.7.1 mixture of particles . . . . . . . . . . . . . . . 1898

LIST OF ABBREVIATIONS AND SYMBOLS

| | |
|---|---|
| C | Centigrad |
| cc | cubic centimeter |
| $cm^2$ | square centimeter |
| d. | day(s) |
| F | Fahrenheit |
| g | gram |
| h | hour(s) |
| J | Joule(s) |
| km | kilometer |
| kv | kilovolt |
| kw | kilowatt |
| mA | milliamper |
| mo. | month(s) |
| min. | minute(s) |
| ml | milliliter |
| Mrad | Megarad |
| sec. | second(s) |
| St. | Saint |
| UV | Ultraviolet |
| W | watt(s) |
| wk. | week(s) |
| yr(s). | year(s) |
| ↑ | to |
| % | percent |

p. XY

TABLE I

SYSTEM OF MINERAL COLOURS AND PAIRED TONALITIES;
ITS APPLICATION IN MODERN ARCHITECTURAL MATERIALS p.1

WHITE

| colour obtained | number | mineral / production process |
|---|---|---|
| | 1 | mineral : Gaspé agate<br>rock : marbled nodule of shaded tints of white, pink and light grey, slightly translucid<br>powder : very light pinkish grey<br>origin : Mont Lyall, Gaspésie, Québec |
| white | 2 | production process:<br>4 g of agate + 40 ml nitric acid / soaking: 1 wk. / separation of the liquid and the solid / natural drying / colour of the solid[1] |
| white | 3 | production process:<br>rock hermetically wrapped in bread dough / 1500 °F / 1 h |
| | 4 | mineral : agate<br>rock : grey (with a light orange circular area on the surface), sightly translucid<br>powder : very light grey<br>origin : unknown |
| white | 5 | production process:<br>3 g of agate + 40 ml hydrochloric acid / soaking: 1 wk. / separation of the liquid and the solid / natural drying / colour of the solid[2] (followed at «green») |
| | 6 | mineral : blue lace agate<br>rock : light violet-blue, lightly translucid<br>powder : very light grey<br>origin : Africa |
| white | 7 | production process:<br>3 g of agate + 40 ml hydrochloric acid / soaking: 1 wk. / separation of the liquid and the solid / natural drying / colour of the solid[347] |
| white, opaque | 8 | production process:<br>rock hermetically wrapped in bread dough / 1600 °F / 1 h |

2

| | | |
|---|---|---|
| | 9 | mineral : tiger-eye agate<br>rock : orange with silky luster, opaque<br>powder : orange with silky luster<br>origin : Africa |
| white | 10 | production process:<br>3 g of agate + 40 ml phosphoric acid / soaking: 2 wk. / drying on hot plate (still humid) / colour of the solid[3] |
| | 11 | mineral : asbestos[4]<br>rock : dark grey (green reflection)<br>powder : light grey (green reflection)<br>origin : Asbestos Corporation Ltd., Thetford Mines, Québec |
| | 12 | mineral : titanium dioxide<br>powder : white<br>origin : NL Chem Canada Inc., Québec |
| | | production process:<br>50 g of asbestos + 200 ml hydrochloric acid or asbestos entirely covered with hydrochloric acid / soaking: 1 wk. / drying on hot plate (vivid yellow): .50 g + .50 g of titanium dioxide (light yellow) / irradiated with gamma rays at: |
| white | 13 | 63.984 Mrad |
| ↓ | | |
| white | 13.1 | 254.204 Mrad[5]<br>(followed at «light creamy yellow») |
| | 14 | mineral : analcime<br>rock : white (grey reflection), crystalline and translucid<br>powder : light grey<br>origin : De-Mix quarry, North side of Mont Saint-Hilaire, Rouville county, Québec |
| white | 15 | production process:<br>1 g of analcime + 50 ml phosphoric acid / soaking: 2 wk. / drying on hot plate (still humid) / colour of the solid[6] |
| white | 16 | production process:<br>1 g of analcime + 50 ml sulphuric acid / soaking: 2 wk. / drying on hot plate |
| | 17 | mineral : apophyllite<br>rock : milky white, translucid<br>powder : white<br>origin : Gaspé Copper Mine, Gaspé, Québec |

3

| | | |
|---|---|---|
| white | 18 | production process:<br>0↑1900 °F (light beige): 1 g + 50 ml sulphuric acid / soaking: 2 wk. / separation of the liquid and the solid / drying on hot plate / colour of the liquid[7] |
| | 19 | mineral : anorthosite<br>rock : dark grey<br>powder : medium grey<br>origin : Jonquière, Lac Saint-Jean, Québec |
| white | 20 | production process:<br>0↑1900 °F (medium brown): .30 g + 50 ml sulphuric acid / soaking: 2 wk. / separation of the liquid and the solid / drying on hot plate / colour of the liquid[7] |
| white | 21 | production process:<br>0↑1900 °F (medium brown): .30 g + 50 ml phosphoric acid / soaking: 2 wk. / drying on hot plate (still humid)[8] |
| | 22 | mineral : labradorite<br>rock : bluish green<br>powder : light grey (light green tone)<br>origin : Chicoutimi county, Québec |
| white | 23 | production process:<br>2 g of labradorite + 20 ml phosphoric acid / soaking: 3 d. / drying on hot plate (still humid) |
| | 24 | mineral : apatite<br>rock : medium brownish red<br>powder : light pinkish beige<br>origin : Ile Calumet, Pontiac county, Québec |
| white | 25 | production process:<br>3 g of apatite + 25 ml hydrochloric acid / soaking: 3 d. / drying on hot plate[8] |
| | 26 | mineral : apatite<br>rock : pale brownish green<br>powder : very light greyish green<br>origin : Black Lake, Thetford county, Québec |
| white | 27 | production process:<br>2 g of apatite + 25 ml sulphuric acid / soaking: 24 h / drying on hot plate |
| | 28 | mineral : apophyllite |

4

| | | |
|---|---|---|
| | | rock : milky white, translucid<br>powder : white<br>origin : Gaspé Copper Mine, Gaspé, Québec |
| white | 29 | <u>production process:</u><br>1 g of apophyllite + 80 ml phosphoric acid / soaking: 2 wk. / drying on hot plate (still humid) / colour of the solid[9] |
| | 30 | mineral : barite<br>rock : pinkish white<br>powder : white<br>origin : Niobec Mine, Saint-Honoré, Saguenay, Québec |
| white | 31 | <u>production process:</u><br>0↑1900 °F (grey-beige [pink reflection]): .30 g + 50 ml phosphoric acid / soaking: 2 wk. / drying on hot plate (still humid) / colour of the solid[10] |
| | 32 | mineral : beryl<br>rock : very light yellowish green, slightly translucid<br>powder : white (green reflection)<br>origin : Lacorne district, Abitibi, Québec |
| white | 33 | <u>production process:</u><br>2 g of beryl + 20 ml ammonia / natural drying |
| | 34 | mineral : calcite[11]<br>powder : white<br>origin : Calcite du Nord Company, Saint-Eugène de Mistassini, Lac Saint-Jean, Québec |
| | | <u>production process:</u><br>2 g of calcite + 2 g of sodium carbonate: |
| white | 35 | 0↑1500 °F + 1 h at 1500 °F |
| white | 36 | 0↑1600 °F + 1 h at 1600 °F |
| white | 37 | 0↑1700 °F + 1 h at 1700 °F |
| white | 38 | 0↑1800 °F + 1 h at 1800 °F |
| white ↓ | 39 | 0↑1900 °F + 1 h at 1900 °F |
| | | mineral : calcite[11]<br>powder : white<br>origin : Calcite du Nord Company, Saint-Eugène de Mistassini, Lac Saint-Jean, Québec |

| | | |
|---|---|---|
| white | 40<br>41 | mineral : chrome<br>powder : light grey, with metallic brilliance<br><br>production process:<br>1 g of calcite + 1 g of chrome / grinding |
| white | 42<br>43 | mineral : calcite (with clayey inclusions)<br>rock : very light creamy yellow, translucid<br>powder : white<br>origin : De-Mix quarry, near Saint-Philippe de Laprairie, Québec<br><br>production process:<br>4 g of calcite + 40 ml hydrochloric acid / soaking: 1 wk. / drying on hot plate |
| white | 44 | production process:<br>4 g of calcite + 40 ml sulphuric acid / soaking: 14 d. / drying on hot plate[12] |
| white | 45 | production process:<br>0↑1600 °F + 15 h at 1600 °F (medium and accentuated pink-orange beige): 2 g + 40 ml sulphuric acid / soaking: 20 d. / drying on hot plate |
| white, lightly translucid | 46 | production process:<br>rock hermetically wrapped in bread dough / 1600 °F / 1 h |
| white | 47<br>48 | mineral : cerite<br>rock : dark brownish grey<br>powder : light grey (light brown tone)<br>origin : Jamestown, Boulder county, Colorado, United States<br><br>production process:<br>4 g of cerite + 100 ml sulphuric acid / soaking: 2 wk. / drying on hot plate |
| white | 49 | production process:<br>0↑1900 °F (medium brown): .60 g + 50 ml phosphoric acid / soaking: 2 wk. / drying on hot plate (still humid)[8] |
| | 50 | mineral : chalcocite<br>rock : dark iron-grey (with localized turquoise oxidation)<br>powder : dark iron-grey<br>origin : Butte, Montana, United States |

6

| | | |
|---|---|---|
| white | 51 | <u>production process:</u><br>4 g of chalcocite + 100 ml phosphoric acid / soaking: 2 wk. / drying on hot plate (still humid) / colour of the solid[13] |
| white | 52 | <u>production process:</u><br>0↑1900 °F (dark iron-grey): .60 g + 200 ml phosphoric acid / soaking: 4 years / drying on hot plate (still humid) / colour of the solid[14] |
| | 53 | mineral : mussel shell or calcium carbonate<br>shell : dark indigo-blue (violet tone)<br>powder : white<br>origin : bank of Saint-Lawrence river, Baie-des-Chaleurs, Gaspésie, Québec |
| white | 54 | <u>production process:</u><br>.50 g of powdered shell + 50 ml phosphoric acid / soaking: 2 wk. / drying on hot plate (still humid)[15] |
| | 55 | mineral : corundum<br>rock : medium grey<br>powder : light grey<br>origin : Transvaal, Africa |
| white | 56 | <u>production process:</u><br>1 g of corundum + 50 ml phosphoric acid / soaking: 2 wk. / drying on hot plate (still humid) / colour of the solid[6] |
| | 57 | mineral : cryolite<br>rock : white, crystalline and translucid<br>powder : white<br>origin : Ivigtut, Groenland |
| white | 58 | <u>production process:</u><br>4 g of cryolite + 50 ml phosphoric acid / soaking: 2 wk. / drying on hot plate (still humid) |
| | 59 | mineral : diopside<br>rock : light grey<br>powder : light beige<br>origin : Mont Orford, Québec |
| white | 60 | <u>production process:</u><br>1 g of diopside + 80 ml phosphoric acid / soaking: 2 wk. / drying on hot plate (still humid) / colour of the solid<br>(followed at «smoky black») |

7

| | | |
|---|---|---|
| | 61 | mineral : epidote<br>rock : green (light brown tone [olive-green type])<br>powder : grey (greenish brown tone)<br>origin : Deloro Road, Madoc, Ontario |
| white | 62 | production process:<br>12 g of epidote + 40 ml phosphoric acid / soaking: 2 wk. / drying on hot plate (still humid) / colour of the solid[16,30] |
| | 63 | mineral : solid epidote<br>rock : brownish green<br>powder : brownish green<br>origin : James Bay, Québec |
| white | 64 | production process:<br>12 g of epidote + 40 ml phosphoric acid / soaking: 1 wk. / separation of the liquid and the solid / drying on hot plate (still humid) / colour of the liquid[7] |
| | 65 | mineral : fluorine<br>rock : violet and white, translucid<br>powder : very light grey<br>origin : Saint-Lawrence Fluorspar Company, Saint-Lawrence, Newfoundland |
| white | 66 | production process:<br>2 g of fluorine + 20 ml ether / natural drying |
| white | 67 | production process:<br>2 g of fluorine + 20 ml ammonia / natural drying |
| | 68 | mineral : fluorine<br>rock : very light yellow, translucid<br>powder : white (light yellow reflection)<br>origin : Saint-Lawrence Fluorspar Company, Saint-Lawrence, Newfoundland |
| white | 69 | production process:<br>2 g of fluorine + 20 ml ammonia / natural drying |
| | 70 | mineral : fluorine<br>rock : pale grey (lilac tone), opaque<br>powder : pale grey (light lilac tone)<br>origin : Saint-Lawrence Fluorspar Company, Saint-Lawrence, Newfoundland |
| white | 71 | production process:<br>2 g of fluorine + 20 ml ether / natural drying |

8

| | | |
|---|---|---|
| white | 72 | production process:<br>2 g of fluorine + 20 ml ammonia / natural drying |
| | 73 | mineral : fluorine<br>rock : pinkish lilac, opaque<br>powder : very light grey (lilac tone), almost white<br>origin : Saint-Lawrence Fluorspar Company, Saint-Lawrence, Newfoundland |
| white | 74 | production process:<br>2 g of fluorine + 20 ml hydrochloric acid / soaking: 3 d. / drying on hot plate (very light grey-beige) / irradiated with gamma rays at 18.85 Mrad |
| | 75 | mineral : clay<br>block : pale greyish green<br>powder : pale greyish green<br>origin : bank of Saint-Lawrence river at the rear of the Miguasha Museum, Gaspésie, Québec |
| white | 76 | production process:<br>1 g of clay + 50 ml phosphoric acid / soaking: 2 wk. / drying on hot plate (still humid) / colour of the solid[9] |
| | | mineral : calcite[11]<br>powder : white<br>origin : Calcite du Nord Company, Saint-Eugène de Mistassini, Lac Saint-Jean, Québec |
| | 77 | mineral : gypsum<br>rock : white (yellow reflection)<br>powder : white (yellow reflection)<br>origin : Geisborough, Nova Scotia |
| white | 78 | production process:<br>1 g of gypsum + 1 g of calcite / 1000 °C / 1 h |
| | 79 | mineral : hornblende<br>rock : medium evergreen (light grey tone), with a vitreous brilliance<br>powder : medium cold grey (light green tone)<br>origin : Abitibi, Québec |
| white | 80 | production process:<br>3 g of hornblende + 20 ml hydrofluoric acid / soaking: 24 h / drying in drying oven at 100°F |

9

| | | |
|---|---|---|
| | 81 | mineral : kaolin<br>rock : chalk-white (yellow reflection)<br>powder : chalk-white (yellow reflection)<br>origin : Saint-Rémi d'Amherst, Québec |
| white | 82 | production process:<br>3 g of kaolin + 50 ml sulphuric acid / soaking: 2 wk. / drying on hot plate |
| white | 83 | production process:<br>3 g of kaolin + 50 ml nitric acid / soaking: 2 wk. / drying on hot plate |
| white | 84 | production process:<br>0↑1900 °F (white [light pink reflection]): .20 g + 50 ml hydrochloric acid / soaking: 2 wk. / drying on hot plate |
| white | 85 | production process:<br>0↑1900 °F (white [light pink reflection]): .20 g + 80 ml phosphoric acid / soaking: 2 wk. / drying on hot plate (still humid) / colour of the solid[13] |
| | 86 | mineral : magnetite<br>rock : dark grey, with metallic brilliance<br>powder : dark grey<br>origin : Fosse du Labrador, Québec |
| white | 87 | production process:<br>3 g of magnetite + 80 ml phosphoric acid / soaking: 2 wk. / drying on hot plate (still humid) / colour of the solid[13] |
| white | 88 | production process:<br>0↑1900 °F (dark chocolate-brown): 1 g + 50 ml phosphoric acid / soaking: 2 wk. / drying on hot plate (still humid) / colour of the solid[13] |
| | 89 | mineral : microcline<br>rock : white (grey reflection)<br>powder : white (grey reflection)<br>origin : Buckingham, Québec |
| white | 90 | production process:<br>4 g of microcline + 50 ml sulphuric acid / soaking: 2 wk. / drying on hot plate |
| white | 91 | production process:<br>2 g of microcline + 2 g of sodium carbonate / 0↑1300 °F + 1 h at 1300 °F (followed at «white [grey reflection]») |

| | | |
|---|---|---|
| | 92 | mineral : olivine<br>powder : colourless (green reflection)<br>origin : Mount Haven, United States |
| white | 93 | <u>production process:</u><br>45 g of olivine + 100 ml phosphoric acid / soaking: 3 wk. / drying on hot plate[17] |
| | 94 | mineral : olivine<br>rock : light grey, crystalline<br>powder : very light grey<br>origin : Mont Albert, Gaspésie, Québec |
| white | 95 | <u>production process:</u><br>0↑1800 °F (orange [red tone]): 1 g + 80 ml phosphoric acid / soaking: 2 wk. / drying on hot plate (still humid) / colour of the solid[18] |
| | 96 | mineral : ochre[20]<br>powder : orange<br>origin : small copper and nickel deposit, in the South-Western area of a mass of serpentinite at 3 km at the West of Saint-Fabien-de-Panet, Québec |
| white | 97 | <u>production process:</u><br>2 g of ochre + 2 g of sodium carbonate / 0↑1500 °F + 1 h at 1500 °F (blue) / irradiated with gamma rays at 64.7 Mrad[21] |
| | 98 | mineral : uraninite<br>rock : medium chocolate-brown (Bordeau red tone)<br>powder : medium milky chocolate-brown<br>origin : Yellowknife, Canada |
| white | 99 | <u>production process:</u><br>8 g of uraninite + 100 ml phosphoric acid / soaking: 4 years / formation of 4 layers of superposed colours, the two first colours at the surface being liquids and, the two at the bottom, solids / drying on hot plate (still humid) / colour of the 2nd layer of colour at the surface, composing the liquid[416] |
| | 100 | mineral : peridotite<br>rock : medium grey<br>powder : medium brownish grey (green reflection)<br>origin : Thetford Mines, Québec |

11

| | | |
|---|---|---|
| white | 101 | production process:<br>4 g of peridotite + 80 ml phosphoric acid / soaking: 2 wk. / drying on hot plate (still humid) / colour of the solid[22] |
| white | 102 | production process:<br>0↑1900 °F (orange-brown): .20 g + 50 ml phosphoric acid / soaking: 2 wk. / drying on hot plate (still humid) / colour of the solid[22] |
| | 103 | mineral : pyrophillite<br>rock : light beige (grey and pink tones), opaque<br>powder : very light beige (grey and orange-pink tones)<br>origin : Carpentier district, Abitibi, Québec |
| white | 104 | production process:<br>1 g of pyrophillite + 80 ml phosphoric acid / soaking: 2 wk. / drying on hot plate (still humid) / colour of the solid[18] |
| | 105 | mineral : nickeliferous pyrrhotite[23]<br>rock : dark iron-grey, with silver and golden yellow metallic brilliance<br>powder : dark iron-grey<br>origin : Inco Co., Sudbury, Ontario |
| white | 106 | production process:<br>0↑1900 °F (dark iron-grey): 1 g + 80 ml phosphoric acid / soaking: 2 wk. / drying on hot plate (still humid) / colour of the solid[22] |
| | 107 | mineral : quartz<br>rock : light pink, translucid<br>powder : very light grey<br>origin : unknown |
| white | 108 | production process:<br>4 g of quartz + 40 ml sulphuric acid / soaking: 22 d. / drying on hot plate[24] |
| | 109 | mineral : rutile<br>powder : dark brown (orange-red reflection)<br>origin : North Stradbroke Island, Queensland, Australia |
| white | 110 | production process:<br>.40 g of rutile + 80 ml phosphoric acid / soaking: 2 wk. / drying on hot plate (still humid) / colour of the solid[6] |

12

| | | |
|---|---|---|
| | 111 | mineral : antigorite<br>rock : pale yellowish green<br>powder : very pale greenish yellow<br>origin : Canadian Refractories Mine, Kilmar, Québec |
| white | 112 | production process:<br>2 g of antigorite + 2 g of sodium carbonate / 0↑1900 °F + 1 h at 1900 °F (mixture of particles: olive-green / beige) / irradiated with gamma rays at 63.88 Mrad |
| | 113 | mineral : smaltite[25]<br>rock : dark iron-grey, with silver metallic brilliance<br>powder : dark grey<br>origin : Cobalt, Ontario |
| white | 114 | production process:<br>0↑1900 °F (dark brown): .30 g + 100 ml phosphoric acid / soaking: 4 years / drying on hot plate (still humid) / colour of the solid[26] |
| | 115 | mineral : sphalerite[27]<br>rock : dark grey, with golden yellow metallic brilliance<br>powder : dark brownish grey<br>origin : Matagami Mine, Matagami, Québec |
| white | 116 | production process:<br>0↑1800 °F (medium chocolate-brown): 1 g + 50 ml sulphuric acid / soaking: 2 wk. / drying on hot plate |
| | 117 | mineral : spodumene<br>rock : pale green<br>powder : light grey, almost white<br>origin : Québec Lithium Co., Baraute, Abitibi, Québec |
| white | 118 | production process:<br>2 g of spodumene + 50 ml phosphoric acid / soaking: 2 wk. / drying on hot plate (still humid) / colour of the solid[6] |
| | 119 | mineral : steatite<br>rock : light evergreen<br>powder : white<br>origin : East Broughton, Québec |

13

| | | |
|---|---|---|
| white | 120 | <u>production process:</u> 0↑2200 °F (light brown): 2 g + 50 ml phosphoric acid / soaking: 2 wk. / drying on hot plate (still humid) / colour of the solid[6] |
| white | 121 | <u>production process:</u> 2 g of steatite + 20 ml hydrofluoric acid / soaking: 24 h / drying in drying oven at 100 °F[28] |
| | 122 | mineral : stibnite<br>rock : dark grey, with silver and blue metallic brilliance<br>powder : dark grey<br>origin : Consolidated Durham Mine, Saint-Georges, New Brunswick |
| white | 123 | <u>production process:</u> 1 g of stibnite + 100 ml nitric acid / soaking: 2 wk. / separation of the liquid and the solid / drying on hot plate (colour of the solid: light creamy yellow) / irradiated with electrons at 162,431 rad (followed at «white, almost pure [very, very light beige reflection]») |
| white | 124 | <u>production process:</u> 1 g of stibnite + 100 ml nitric acid / soaking: 2 wk. / separation of the liquid and the solid / drying on hot plate / colour of the liquid[29] |
| | 125 | mineral : stilbite<br>rock : white (honey-yellow reflection)<br>powder : white (honey-yellow reflection)<br>origin : Lac d'amiante Mine, Black Lake, Québec |
| white | 126 | <u>production process:</u> 3 g of stilbite + 40 ml phosphoric acid / soaking: 1 wk. / drying on hot plate (still humid) / colour of the solid[30] |
| white | 127 | <u>production process:</u> 1500 °F / 1 h (chalk-white [orange reflection]): .50 g + 40 ml sulphuric acid / soaking: 1 wk. / drying on hot plate |
| | 128 | mineral : sphalerite[31]<br>rock : honey-yellow<br>powder : pale honey-yellow<br>origin : Fédéral Mine, Lemieux district, Gaspésie, Québec |

14

| | | |
|---|---|---|
| white | 129 | production process:<br>4 g of sphalerite + 25 ml sulphuric acid / soaking: 24 h / drying on hot plate[32] |
| white [very white] | 130 | production process:<br>1 g of sphalerite + 25 ml nitric acid / as soon as deposited, the bubbling starts / immediately after the bubbling, separation of the liquid and the solid / immediate drying on hot plate / colour of the solid[33] |
| | 131 | mineral : tremolite<br>rock : medium brown (evergreen tone)<br>powder : greyish beige<br>origin : Tetreault Mine, Montauban, Portneuf county, Québec |
| white | 132 | production process:<br>6 g of tremolite + 50 ml phosphoric acid / soaking: 2 wk. / drying on hot plate (still humid) / colour of the solid[6] |
| white | 133 | production process:<br>6 g of tremolite + 50 ml sulphuric acid / soaking: 2 wk. / drying on hot plate |
| | 134 | mineral : obsidian<br>rock : very dark smoky grey, almost black<br>powder : light grey<br>origin : Arkansas, United States |
| white | 135 | production process:<br>2 g of obsidian + 20 ml hydrochloric acid / soaking: 3 d. / drying on hot plate[34] |
| | 136 | mineral : wilsonite, local variety of scapolite or wernerite<br>rock : grey (violet tone)<br>powder : light grey (lilac tone)<br>origin : Tetreault Mine, Montauban, Portneuf county, Québec |
| white | 137 | production process:<br>0↑1900 °F (very light beige-grey): .50 g + 50 ml sulphuric acid / soaking: 2 wk. / drying on hot plate |
| white | 138 | production process:<br>.50 g of wilsonite + .50 g of sodium carbonate / grinding |

| | | |
|---|---|---|
| | | mineral : steatite<br>rock : light evergreen<br>powder : white<br>origin : East Broughton, Québec |
| white | 139 | <u>production process:</u><br>2 g of steatite + 20 ml of a tartaric[35] acid solution / soaking: 3 d. / drying on hot plate (white [light creamy reflection]) / irradiated with electrons at 302,831 rad[36] |
| | 140 | mineral : calcite<br>rock : light pink<br>powder : pinkish white<br>origin : Huddersfield district, Pontiac county, Québec |
| white | 141 | <u>production process:</u><br>4 g of calcite + 20 ml phosphoric acid / soaking: 3 d. / drying on hot plate (still humid) / colour of the solid[37] |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland |
| white | 142 | <u>production process:</u><br>2 g of fluorine + 20 ml phosphoric acid / soaking: 3 d. / drying on hot plate (still humid) / colour of the liquid[38] |
| | | mineral : cryolite<br>rock : white, crystalline and translucid<br>powder : white<br>origin : Ivigtut, Groenland |
| white | 143 | <u>production process:</u><br>4 g of cryolite + 50 ml sulphuric acid / soaking: 2 wk. / drying on hot plate |
| | | mineral : fluorine<br>rock : violet and white, translucid<br>powder : very light grey<br>origin : Saint-Lawrence Fluorspar Company, Saint-Lawrence, Newfoundland |
| white | 144 | <u>production process:</u><br>0†1000 °C |
| | 145 | mineral : sodium carbonate |

| | | |
|---|---|---|
| white | 146 | powder : white<br><br>production process:<br>1500 °F (cream) / irradiated with gamma[239] rays at 64.7 Mrad |
| white more pure than «white» | 147 | production process:<br>irradiated with electrons[38a] at 302,831 rad[36] |
| chalk-white | 148 | mineral : agate<br>rock : grey (with a light orange circular area on the surface), sightly translucid<br>powder : very light grey<br>origin : unknown<br><br>production process:<br>2 g of agate + 20 ml nitric acid / soaking: 3 d. / drying on hot plate |
| chalk-white | 149 | mineral : blue lace agate<br>rock : light violet-blue, lightly translucid<br>powder : very light grey<br>origin : Africa<br><br>production process:<br>rock heated at 1600 °F / 1 h |
| chalk-white | 150 | mineral : gypsum<br>rock : white (yellow reflection)<br>powder : white (yellow reflection)<br>origin : Geisborough, Nova Scotia<br><br>production process:<br>2 g of gypsum + 2 g of sodium carbonate:<br>0↑1500 °F + 1 h at 1500 °F |
| ↓ chalk-white | 151 | 0↑1600 °F + 1 h at 1600 °F |
| ↓ chalk-white | 152 | 0↑1700 °F + 1 h at 1700 °F |
| ↓ chalk-white | 153 | 0↑1800 °F + 1 h at 1800 °F |
| ↓ chalk-white | 154 | 0↑1900 °F + 1 h at 1900 °F |
| chalk-white | 155 | mineral : microcline<br>rock : white (grey reflection)<br>powder : white (grey reflection)<br>origin : Buckingham, Québec<br>production process:<br>1300 °F / 1 h |

| | | |
|---|---|---|
| | | mineral : microcline<br>rock : white (grey reflection)<br>powder : white (grey reflection)<br>origin : Buckingham, Québec |
| | 156 | mineral : sulphur<br>rock : brilliant yellow<br>powder : brilliant yellow<br>origin : unknown |
| | | production process: |
| chalk-white | 157 | 2 g of microcline + 2 g of sulphur / 1300 °F / 1 h |
| | 158 | mineral : sardonyx<br>rock : white, slightly translucid (with a light orange-amber circular area on the surface)<br>powder : very light grey<br>origin : unknown |
| | | production process: |
| chalk-white | 159 | 1600 °F / 1 h[39,133] |
| | | mineral : agate<br>rock : grey (with a light orange circular area on the surface), slightly translucid<br>powder : very light grey<br>origin : unknown |
| | | production process: |
| chalk-white | 160 | 1500 °F / 1 h[40,133] |
| ↓ | | |
| chalk-white | 161 | 1600 °F / 1 h[133] |
| | | production process: |
| chalk-white | 162 | rock hermetically wrapped in bread dough / 1600 °F / 1 h[133] |
| | 163 | mineral : halite[41]<br>rock : colourless<br>powder : colourless<br>origin : Seleine Mine, Iles-de-la-Madeleine, Québec |
| | | production process: |
| white slightly milky | 164 | 2 g of halite + 20 ml nitric acid / soaking: 3 d. / drying on hot plate |
| | 165 | mineral : zinc concentrate grilled at 1000 °C $(ZnO\text{-}FeO)(SO_4)$<br>powder : reddish brown |

18

| | | |
|---|---|---|
| milky white | 166 | origin : Zinc Electrolytic du Canada Co., Montréal, Québec<br><br>production process:<br>4 g of concentrate + 50 ml phosphoric acid / soaking: 4 wk. / drying on hot plate (still humid) |
| white slightly milky | 166.1 | mineral : tellurium<br>powder : dark metallic grey<br>origin : Minéraux Noranda Inc., lot 64, Montréal, Québec<br><br>production process:<br>150 g of molten glass (sodalime) is collected, at the state of fusion, in a furnace (1200 °C) on a metal rod / .45 g of tellurium is sprinkled at the surface of the glass / then, the entity is introduced in the furnace and melted with the flame at 1200 °C / then, the «collect» is removed from the metal rod (light and milky cream [yellow tone] ) / cooling / deposited in the furnace / 0↑1000 °C / slow cooling in furnace |
| white slightly milky | 166.2 | production process:<br>150 g of molten glass (sodalime) is collected, at the state of fusion, in a furnace (1200 °C) on a metal rod / 1 g of tellurium is sprinkled at the surface of the glass / then, the entity is introduced in the furnace and melted with the flame at 1200 °C / then, the collect is removed from the metal rod ( light and milky cream [yellow tone] ) / cooling / deposited in the furnace / 0↑1000 °C / slow cooling in furnace |
| milky white | 166.3 | mineral : fluorine<br>rock : colourless<br>powder : colourless<br>origin : Ohio, United States<br><br>production process:<br>1 g of fluorine + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : orpiment<br>rock : vivid yellow (orange tone)<br>powder : vivid yellow (orange tone)<br>origin : Nevada, United States |

| | | |
|---|---|---|
| milky white | 166.4 | production process:<br>1 g of orpiment + 5 g of pyrex / manual grinding / heating: 5 °C per min. 0↑1245 °C + maintenance during 1 h / cooling: 5 °C per min. until ambient temperature is reached / the entity is done in ambient air |
| milky white [with «dark greyish brown» particles] | 166.5 | mineral : sulphur<br>rock : brilliant yellow<br>powder : brilliant yellow<br>origin : unknown<br><br>production process:<br>1 g of sulphur + 5 g of pyrex / manual grinding / heating: 5 °C per min. 0↑1245 °C + maintenance during 1 h / cooling: 5 °C per min. until ambient temperature is reached / the entity is done in ambient air |
| | 167 | mineral : milky quartz<br>rock : milky quartz, translucid<br>origin : Ferme Adam, Bonsecours, Eastern Townships, Québec |
| white more white, more milky and more opaque than «translucid milky white» | 168 | production process:<br>1600 °F / 1 h |
| | 169 | mineral : quartz (with impurities of white kaolinite)<br>rock : opaline white, slightly translucid<br>origin : quarry near Saint-Rémi d'Amherst, Québec |
| white more white than «opaline white» | 170 | production process:<br>rock hermetically wrapped in bread dough / 1600 °F / 1 h[42] |
| white more white and a bit more opaque than «opaline white» | 171 | production process:<br>1500 °F / 1 h |
| | | mineral : halite[41]<br>rock : colourless<br>powder : colourless<br>origin : Seleine Mine, Iles-de-la-Madeleine, Québec |

| | | |
|---|---|---|
| white more opaque than «colourless» | 172 | production process:<br>rock hermetically wrapped in bread dough /<br>1500 °F / 1 h |
| | | mineral : calcite (with clayey inclusions)<br>rock : very light creamy yellow, translucid<br>powder : white<br>origin : De-Mix quarry, near Saint-Philippe de Laprairie, Québec |
| white, semi-opaque | 173 | production process:<br>0†500 °F<br>(followed at «beige tone») |
| | 174 | mineral : fluorine<br>rock : colourless<br>powder : colourless<br>origin : Ohio, United States |
| white, semi-opaque | 175 | production process:<br>1500 °F / 1 h |
| | 176 | mineral : fluorine<br>rock : very pale yellow, translucid<br>powder : white (light yellow reflection)<br>origin : Ohio, United States |
| white, semi-opaque | 177 | production process:<br>1500 °F / 1 h |
| | 178 | mineral : fluorine<br>rock : reddish violet, translucid<br>powder : very light grey<br>origin : Ohio, United States |
| white, semi-opaque | 179 | production process:<br>1500 °F / 1 h |
| | 180 | mineral : crystalline quartz<br>rock : colourless<br>origin : Ferme Adam, Bonsecours, Eastern Townships, Québec |
| white, semi-opaque | 181 | production process:<br>1600 °F / 1 h |
| | | mineral : quartz<br>rock : light pink, translucid<br>powder : very light grey<br>origin : unknown |
| white, semi-opaque | 182 | production process:<br>1600 °F / 1 h[43] |

21

| | | |
|---|---|---|
| white, opaque | 183 | mineral : sardonyx<br>rock : white, slightly translucid (with a light orange-amber circular area on the surface)<br>powder : very light grey<br>origin : unknown<br><br>production process:<br>rock hermetically wrapped in bread dough / 1600 °F / 1 h[44,133] |
| white | 184 | mineral : beryl<br>rock : very light yellowish green, slightly translucid<br>powder : white (green reflection)<br>origin : Lacorne district, Abitibi, Québec<br><br>production process:<br>2 g of beryl + 20 ml phosphoric acid / soaking: 3 d. / drying on hot plate (still humid) / colour of solid[30] |
| | 185 | mineral : dolomite<br>rock : light grey<br>powder : light grey<br>origin : Shefferville, Ungava, Québec |
| white | 186 | production process:<br>2 g of dolomite + 20 ml phosphoric acid / soaking: 3 d. / drying on hot plate (still humid) / colour of the solid[30] |
| white | 187 | mineral : halite[41]<br>rock : colourless<br>powder : colourless<br>origin : Seleine Mine, Iles-de-la-Madeleine, Québec<br><br>production process:<br>2 g of halite + 20 ml ammonia / natural drying |
| white | 188 | production process:<br>2 g of halite + 20 ml phosphoric acid / soaking: 3 d. / drying on hot plate (still humid) / colour of the solid[30] |
| | | mineral : calcite[11]<br>powder : white<br>origin : Calcite du Nord Company, Saint-Eugène de Mistassini, Lac Saint-Jean, Québec |

22

| | | |
|---|---|---|
| | | mineral : halite[41]<br>rock : colourless<br>powder : colourless<br>origin : Seleine Mine, Iles-de-la-Madeleine, Québec<br><br>production process: |
| white | 189 | 1 g of calcite + 1 g of halite / 1000 °C / 1 h |
| | 190 | mineral : mica<br>rock : golden brown, with vitreous luster, translucid<br>powder : light amber, with vitreous luster, translucid<br>origin : Lac Vert mountain, region of Low, near Hincks, Québec<br><br>production process: |
| white | 191 | 4 g of mica + 50 ml phosphoric acid / soaking: 4 wk. / drying on hot plate (still humid)[30] |
| | 192 | mineral : orthoclase<br>rock : white (grey reflection)<br>powder : white (grey reflection)<br>origin : mine near Buckingham, Papineau county, Québec<br><br>production process: |
| white | 193 | 2 g of orthoclase + 20 ml phosphoric acid / soaking: 3 d. / drying on hot plate (still humid) / colour of the solid[30] |
| | 194 | mineral : orthoclase<br>rock : light pinkish beige<br>powder : very light beige<br>origin : mine near Buckingham, Papineau county, Québec<br><br>production process: |
| white | 195 | 2 g of orthoclase + 200 ml phosphoric acid / soaking: 3 d. / drying on hot plate (still humid) / colour of the solid[30] |
| | 196 | mineral : sericite shale<br>rock : light grey (green reflection)<br>powder : very, very light grey<br>origin : Magog, Québec<br>production process: |
| white | 197 | 2 g of shale + 20 ml phosphoric acid / soaking: 3 d. / drying on hot plate (still humid) |

23

| | | |
|---|---|---|
| almost pure white | 198 | mineral : apophyllite<br>rock : milky white, translucid<br>powder : white<br>origin : Gaspé Copper Mine, Gaspé, Québec<br><br>production process:<br>0↑1800 °F (light grey): .20 g + 50 ml sulphuric acid / soaking: 2 wk. / drying on hot plate (white [light green reflection]) / irradiated with electrons at 302,831 rad[36] |
| almost pure white | 199 | mineral : cryolite<br>rock : white, crystalline and translucid<br>powder : white<br>origin : Ivigtut, Groenland<br><br>production process:<br>4 g of cryolite + 50 ml hydrochloric acid / soaking: 2 wk. / drying on hot plate (white [light yellow reflection]) / irradiated with electrons at 302,831 rad[36] |
| pure white | 200 | production process:<br>4 g of cryolite + 50 ml nitric acid / soaking: 2 wk. / drying on hot plate (white [orange reflection]) / irradiated with electrons at 302,831 rad[36] |
| pure white | 201 | production process:<br>0↑1600 °F (white [with yellowish areas]): .20 g + 50 ml nitric acid / soaking: 2 wk. / drying on hot plate (white [light yellow reflection]) / irradiated with electrons at 162,431 rad |
| pure white | 202 | mineral : gypsum<br>rock : white (yellow reflection)<br>powder : white (yellow reflection)<br>origin : Geisborough, Nova Scotia<br><br>production process:<br>powder irradiated with electrons at 302,831 rad[36] |
| pure and luminous white | 203 | production process:<br>2 g of gypsum + 20 ml hydrochloric acid / soaking: 3 d. / drying on hot plate (chalk-white [light yellow reflection]) / irradiated with electrons at 302,831 rad[36] |
| | 204 | mineral : dolomite<br>rock : white (localized yellow reflection), crystalline and translucid |

| | | |
|---|---|---|
| pure white | 205 | powder : white<br>origin : Bristol district, Pontiac county, Québec<br><br><u>production process:</u><br>2 g of dolomite + 20 ml hydrofluoric acid / soaking: 24 h / drying in drying oven at 100 °F (white [yellow reflection]) / irradiated with electrons at 302,831 rad[36] |
| pure white | 206 | mineral : calcite[11]<br>powder : white<br>origin : Calcite du Nord Company, Saint-Eugène de Mistassini, Lac Saint-Jean, Québec<br><br><u>production process:</u><br>2 g of calcite + 2 g of sodium carbonate / 0↑1900 °F + 1 h at 1900 °F (white) / irradiated with electrons at 302,831 rad[36] |
| white<br>↓ which becomes<br>more white | 207<br><br>208 | <u>production process:</u><br>powder irradiated with electrons at:<br>162,431 rad<br><br>302,831 rad[45] |
| pure white | 209 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>4 g of calcite + 40 ml sulphuric acid / soaking: 14 d. / drying on hot plate (white) / irradiated with electrons at 305,200 rad[46] |
| pure white | 210 | mineral : calcite<br>rock : light pink<br>powder : pinkish white<br>origin : Huddersfield district, Pontiac county, Québec<br><br><u>production process:</u><br>powder irradiated with electrons at 302,831 rad[36] |
| | | mineral : cryolite<br>rock : white, crystalline and translucid<br>powder : white<br>origin : Ivigtut, Groenland |

| | | |
|---|---|---|
| | | production process:<br>0↑1600 °F (white [with yellowish areas]): .20 g + 50 ml hydrochloric acid / soaking: 2 wk. / drying on hot plate (very light yellow) / irradiated with electrons at: |
| white | 211 | 162,431 rad |
| ↓ | | |
| more pure white | 212 | 302,831 rad[45] |
| | | mineral : dolomite<br>rock : white (localized yellow reflection), crystalline and translucid<br>powder : white<br>origin : Bristol district, Pontiac county, Québec |
| pure white | 213 | production process:<br>powder irradiated with electrons at 302,831 rad[36] |
| pure white | 214 | production process:<br>rock irradiated with electrons at 305,200 rad[46,47] |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland |
| pure white | 215 | production process:<br>rock hermetically wrapped in bread dough / 1600 °F / 1 h (chalk-white [with orange areas]) / irradiated with electrons at 305,200 rad[46,53] |
| | | mineral : gypsum<br>rock : white (yellow reflection)<br>powder : white (yellow reflection)<br>origin : Geisborough, Nova Scotia |
| pure white | 216 | production process:<br>2 g of gypsum + 2 g of sodium carbonate / 0↑1900 °F + 1 h at 1900 °F (chalk-white) / irradiated with electrons at 302,831 rad[36] |
| | | mineral : kaolin<br>rock : chalk-white (yellow reflection)<br>powder : chalk-white (yellow reflection)<br>origin : Saint-Rémi d'Amherst, Québec |

26

| | | |
|---|---|---|
| pure white | 217 | production process: (followed at «very light beige») 0↑1900 °F (white [light pink reflection]): .20 g + 50 ml hydrochloric acid / soaking: 2 wk. / drying on hot plate (white) / irradiated with electrons at 302,831 rad[45] |
| pure white | 218 | mineral : microcline<br>rock : white (grey reflection)<br>powder : white (grey reflection)<br>origin : Buckingham, Québec<br>production process:<br>1300 °F / 1 h (chalk-white) / powder irradiated with electrons at 302,831 rad[36] |
| pure white | 219 | production process:<br>4 g of microcline + 50 ml sulphuric acid / soaking: 2 wk. / drying on hot plate (white) / irradiated with electrons at 302,831 rad[36] |
| pure white | 220 | mineral : steatite<br>rock : light evergreen<br>powder : white<br>origin : East Broughton, Québec<br>production process:<br>2 g of steatite + 20 ml hydrofluoric acid / soaking: 24 h / drying in drying oven at 100 °F (white) / irradiated with electrons at 302,831 rad[36] |
| pure and luminous white | 221 | mineral : gypsum<br>rock : white (yellow reflection)<br>powder : white (yellow reflection)<br>origin : Geisborough, Nova Scotia<br>production process:<br>1000 °C / 1 h (white [light yellow reflection]) / powder irradiated with electrons at 302,831 rad[36] |
| pure and luminous white | 222 | mineral : kaolin<br>rock : chalk-white (yellow reflection)<br>powder : chalk-white (yellow reflection)<br>origin : Saint-Rémi d'Amherst, Québec<br>production process:<br>3 g of kaolin + 50 ml nitric acid / soaking: 2 wk. / drying on hot plate (white) / irradiated with electrons at 302,831 rad[36] |

| | | |
|---|---|---|
| | 223 | mineral : molybdenite[48] (flakes of $MoS_2$ + pegmatite [quartz + bismuth])<br>rock : transparent and grey<br>powder : medium cold grey<br>origin : Lamotte, Abitibi, Québec |
| crystalline white | 224 | production process:<br>0↑1900 °F (mixture of particles: white [yellow reflection] / brown): .40 g + 50 ml sulphuric acid / soaking: 2 wk. / drying on hot plate[49] |
| | | mineral : fluorine<br>rock : reddish violet, translucid<br>powder : very light grey<br>origin : Ohio, United States |
| crystalline white | 224.1 | production process:<br>1 g of fluorine + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : fluorine<br>rock : very light yellow, translucid<br>powder : white (light yellow reflection)<br>origin : Saint-Lawrence Fluorspar Company, Saint-Lawrence, Newfoundland |
| crystalline white | 224.2 | production process:<br>1 g of fluorine + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : crystalline quartz<br>rock : colourless<br>powder : colourless<br>origin : Eastern Townships, Ferme Adam, Bonsecours, Québec |
| crystalline white [with «dark greyish brown» particles] | 224.3 | production process:<br>1 g of quartz + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : sulphur<br>rock : brilliant yellow<br>powder : brilliant yellow<br>origin : unknown |

| | | |
|---|---|---|
| very crystalline white | 224.4 | production process:<br>1 g of quartz + 5 g of pyrex / manual grinding / heating: 5 °C per min. 0↑1245 °C + maintenance during 1 h / cooling: 5 °C per min. until ambient temperature is reached / the entity is done in ambient air |
| white, almost totally transparent | 225 | mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>powder irradiated with electrons at 302,831 rad[36,50] |
| transparent white | 226 | mineral : crystalline quartz<br>rock : colourless<br>powder : colourless<br>origin : Eastern Townships, Ferme Adam, Bonsecours, Québec<br><br>production process:<br>rock hermetically wrapped in bread dough / 1600 °F / 1 h |
| transparent white [with «iron-grey» particles»] | 226.1 | mineral : selenium<br>powder : dark metallic grey<br>origin : Minéraux Noranda Inc., lot 3847, Montréal, Québec<br><br>production process:<br>2 independent masses of 150 g of molten glass (sodalime) are collected at the state of fusion (1200 °C) in a furnace, on 2 independant metal rods / 2 g of selenium are sprinkled at the surface of only one side of the 2 masses, surface which is afterwards covered by the other mass, therefore imprisonning the pigment in a sandwich / then, the entity is introduced in the furnace and melted with the flame at 1200 °C so that theyfuse together / then, the resulting «collect» is removed from the metal rods (very, very light pink) / this «collect» is deposited on a ceramic plate in a furnace in ambient air and heated 0↑1000 °C / we close the furnace / the glass cools progressively until it reaches 0 °C |

29

| | | |
|---|---|---|
| transparent white (with «iron-grey» particles) | 226.2 | production process: approximately 150 g of molten glass (sodalime) were collected at the state of fusion (1200 °C) in a furnace on a metal rod / .45 g of selenium was sprinkled at the surface of the glass in fusion / / then, the entity was reintroduced in the furnace and melted at the flame at 1200 °C / then, the «collect» was detached from the metal rod (transparent white [with «iron-grey» particles]) / the «collect» is put on a ceramic plate in a furnace in a normal atmosphere and heated from 0 °C to 1000 °C / we turn the furnace off / the glass cools progressively to 0 °C |
| | | mineral : barite<br>rock : pinkish white<br>powder : white<br>origin : Niobec Mine, Saint-Honoré, Saguenay, Québec |
| transparent white | 227 | production process: 4 g of barite + 50 ml sulphuric acid / soaking: 2 wk. / drying on hot plate |
| | | mineral : wilsonite, local variety of scapolite or wernerite<br>rock : grey (violet tone)<br>powder : light grey (lilac tone)<br>origin : Tetrault Mine, Montauban, Portneuf County, Québec |
| | | production process: 3 g of wilsonite + 80 ml sulphuric acid / soaking: 2 wk. / drying on hot plate (white [light localized lilac reflection]) / electron irradiation at: |
| white much more pure than the «white (light localized lilac reflection)» ↓ | 229 | 162,431 rad |
| white still more pure | 230 | 302,831 rad[45] |
| white (lilac reflection) | | |
| | | mineral : wilsonite, local variety of scapolite or wernerite<br>rock : grey (violet tone)<br>powder : clear grey (lilac tone)<br>origin : Tetreault Mine, Montauban, Portneuf |

30

| | | |
|---|---|---|
| | | County, Québec |
| white (light localized lilac reflection) | 231 | production process:<br>3 g of wilsonite + 80 ml sulphuric acid / soaking: 2 wk. / drying on hot plate |
| white (blue reflection) | | |
| white (blue reflection) | 232 | mineral : Gaspé agate<br>rock : marbled nodule with shaded tints of white, pink and light grey, slightly translucid<br>powder : very light pinkish grey<br>origin : Mont Lyall, Gaspésie, Québec<br><br>production process:<br>4 g of agate + 40 ml nitric acid / soaking: 1 wk. / separation of the liquid and the solid / natural drying / colour of the solid[52] |
| white (blue or grey reflection) | 233 | mineral : agate<br>rock : grey (with a light orange circular area on the surface), slightly translucid<br>powder : very light grey<br>origin : unknown<br><br>production process:<br>1500 °F / 1 h (chalk-white) / rock irradiated with gamma rays at:<br>64.7 Mrad |
| ↓ | | |
| white (blue or grey reflection more intense) | 234 | 424.7 Mrad |
| white (blue or grey reflection) | 235 | mineral : dolomite<br>rock : white (yellow localized reflection), crystalline and translucid<br>powder : white<br>origin : Bristol district, Pontiac county, Québec<br><br>production process:<br>powder irradiated with gamma rays at:<br>5.7 Mrad |
| ↓ | | |
| white (more accentuated blue or | 236 | 64.7 Mrad |

| | | |
|---|---|---|
| grey reflection) | | (followed at «light yellow [orange tone]») |
| white (light blue reflection) | 237 | mineral : amazon stone<br>rock : clear greenish turquoise, translucid<br>powder : white (turquoise reflection)<br>origin : unknown |
| | 238 | production process:<br>4 g of amazon stone + 40 ml nitric acid / soaking: 1 wk. / separation of the liquid and the solid / natural drying / colour of the solid[39a] |
| white (turquoise reflection) | | |
| | 239 | mineral : amazonite<br>rock : greenish turquoise<br>powder : white (turquoise reflection)<br>origin : Lac Saint-Jean, Québec |
| white (turquoise reflection very slightly more accentuated) | 240 | production process:<br>powder irradiated with gamma rays at 64.7 Mrad<br><br>(followed at «greenish turquoise [greyish beige reflection]») |
| white (turquoise reflection very, very lightly accentuated) | 241 | production process:<br>powder irradiated with electrons at 302,831 rad[36] |
| white (green reflection) | | |
| | | mineral : blue lace agate<br>rock : light violet-blue, slightly translucid<br>powder : very light grey<br>origin : Africa |
| white (green reflection) | 242 | production process:<br>3 g of agate + 40 ml nitric acid / soaking: 1 wk. / separation of the liquid and the solid / natural drying / colour of the solid[54] |
| | | mineral : sardonyx<br>rock : white, slightly translucid (with a light orange-amber circular area on the surface)<br>powder : very light grey<br>origin : unknown |
| white (green | 243 | production process:<br>4 g of sardonyx + 40 ml nitric acid / soaking: 1 |

32

| | | |
|---|---|---|
| reflection) | | wk. / separation of the liquid and the solid / natural drying / colour of the solid[55] |
| white (green reflection) | 244 | mineral : agate<br>rock : grey (with a light orange circular area on the surface), slightly translucid<br>powder : very light grey<br>origin : unknown<br><br>production process:<br>3 g of agate + 40 ml nitric acid / soaking: 1 wk. / separation of the liquid and the solid / natural drying / colour of the solid[54] |
| white (light green reflection) | 245 | mineral : apophyllite<br>rock : milky white, translucid<br>powder : white<br>origin : Gaspé Copper Mine, Gaspé, Québec<br><br>production process:<br>0↑1800 °F (light grey)[56]: .20 g + 50 ml sulphuric acid / soaking: 2 wk. / drying on hot plate |
| white (green reflection) | 246 | mineral : calcite[11]<br>powder : white<br>origin : Calcite du Nord Company, Saint-Eugène de Mistassini, Lac Saint-Jean, Québec<br><br>production process:<br>4 g of calcite + 25 ml hydrochloric acid / soaking: 24 h / drying on hot plate |
| | 247 | mineral : fluorescent calcite<br>rock : white (localized grey or brown reflection), translucid<br>powder : white (yellow reflection)<br>origin : Bancroft, Ontario<br><br>production process:<br>(followed from «brownish beige [light pinkish orange tone]»)<br>2 g of calcite + 2 g of sodium carbonate: |
| white (light green reflection) | 248 | 0↑1500 °F + 15 min. at 1500 °F |
| white (green reflection a little more accentuated) | 249 | 0↑1500 °F + 30 min. at 1500 °F |
| white (green reflection still | 250 | 0↑1500 °F + 45 min. at 1500 °F |

33

| | | |
|---|---|---|
| a little more accentuated)<br>↓<br>white (green reflection still a little more accentuated) | 251 | 0↑1500 °F + 1 h at 1500 °F (followed at «beige ochre [yellow tone] or yellow ochre [beige tone]») |
| white (light green reflection) | 252 | mineral : cerite<br>rock : dark brownish grey<br>powder : light grey (light brown tone)<br>origin : Jamestown, Boulder county, Colorado, United States<br><br>production process:<br>0↑1900 °F (medium brown): .60 g + 50 ml sulphuric acid / soaking: 2 wk. / drying on hot plate[57] |
| white (green reflection) | 253 | mineral : fluorine<br>rock : colourless<br>powder : colourless<br>origin : Ohio, United States<br><br>production process:<br>1 g of fluorine + 1 g of sodium carbonate / 1600 °F / 1 h |
| white (green reflection) | 254<br>255 | mineral : fluorine<br>rock : very light fluor-green (cold mint-green type), translucid<br>powder : very light grey<br>origin : Rogers Mine, Madoc, Ontario<br><br>production process:<br>1 g of fluorine + 1 g of sodium carbonate / 1700 °F / 1 h |
| white (light green reflection) | 256<br>257 | mineral : biotite gneiss<br>rock : blackish grey, golden vitreous brilliance<br>powder : dark grey<br>origin : Grenville geological province, Québec<br><br>production process:<br>1600 °F / 15 h (medium orange-pink, mat): .50 g + 40 ml sulphuric acid / soaking: 14 d. / drying on hot plate |
| | | mineral : amazon stone<br>rock : light greenish turquoise, translucid<br>powder : white (turquoise reflection)<br>origin : unknown |

| | | |
|---|---|---|
| white (apple-green reflection) | 258 | production process: 4 g of amazon stone + 40 ml hydrochloric acid / soaking: 1 wk. / separation of the liquid and the solid / natural drying / colour of the solid[59] |
| white (green reflection) | 259 | mineral : quartz<br>rock : light pink, translucid<br>powder : very light grey<br>origin : unknown<br><br>production process: 4 g of quartz + 40 ml nitric acid / soaking: 7 d. / separation of the liquid and the solid / natural drying / colour of the solid[59] |
| white (green reflection) | 260 | mineral : stilbite<br>rock : white (honey reflection)<br>powder : white (honey reflection)<br>origin : Lac d'amiante Mine, Black Lake, Québec<br><br>production process: 3 g of stilbite + 40 ml nitric acid / natural drying |
| white (cream reflection) | | |
| white (cream reflection) | 261 | mineral : apophyllite<br>rock : milky white, translucid<br>powder : white<br>origin : Gaspé Copper Mine, Gaspé, Québec<br><br>production process: 1 g of apophyllite + 60 ml sulphuric acid / soaking: 2 wk. / drying on hot plate |
| | 262 | mineral : armenite<br>rock : light grey<br>powder : very light grey<br>origin : Abitibi, Québec |
| white (cream reflection) | 263 | production process: 1 g of armenite + 80 ml phosphoric acid / soaking: 2 wk. / drying on hot plate (still humid)[40] |
| | | mineral : barite<br>rock : pinkish white<br>powder : white<br>origin : Niobec Mine, Saint-Honoré, Saguenay, Québec |

| | | |
|---|---|---|
| white (cream reflection) | 264 | production process:<br>0↑1900 °F (greyish beige [pink reflection]): .30 g + 50 ml sulphuric acid / soaking: 2 wk. / drying on hot plate |
| | | mineral : olivine<br>rock : light grey, crystalline<br>powder : very light grey<br>origin : Mont Albert, Gaspésie, Québec |
| white (light cream reflection) | 265 | production process:<br>0↑1800 °F (orange [red tone]): 1 g + 50 ml sulphuric acid / soaking: 2 wk. / drying on hot plate |
| | | mineral : calcite[11]<br>powder : white<br>origin : Calcite du Nord Company, Saint-Eugène de Mistassini, Lac Saint-Jean, Québec<br><br>mineral : orthose<br>rock : white (grey reflection)<br>powder : white (grey reflection)<br>origin : mine near Buckingham, Papineau county, Québec |
| white (light cream reflection) | 266 | production process:<br>1 g of calcite + 1 g of orthoclase / 1000 °C / 1 h |
| | 267 | mineral : pyrochlore<br>powder : reddish brown<br>origin : De-Mix quarry, North side of Mont Saint-Hilaire, Rouville county, Québec |
| white (pinkish cream reflection) | 268 | production process:<br>.40 g of pyrochlore + 50 ml sulphuric acid / soaking: 2 wk. / drying on hot plate[24] |
| | | mineral : steatite<br>rock : light evergreen<br>powder : white<br>origin : East Broughton, Québec |
| white (light cream reflection) | 269 | production process:<br>2 g of steatite + 20 ml of a tartaric acid solution[35] / soaking: 3 d. / drying on hot plate |

36

| | | |
|---|---|---|
| | 270 | mineral : yofortierite[87]<br>rock : dark chocolate-brown (with pinkish brown areas)<br>powder : dark chocolate-brown<br>origin : De-Mix quarry, North side of Mont-Saint-Hilaire, Rouville county, Québec |
| white cream | 271 | production process:<br>1 g of yofortierite + 50 ml sulphuric acid / soaking: 2 wk. / separation of the liquid and the solid / drying on hot plate (colour of the solid: intense blue) / irradiated with electrons at 302,831 rad[36] |
| | 272 | mineral : zincite<br>rock : mixture of areas: dark grey / orange-red<br>powder : medium milky chocolate-brown (red tone)<br>origin : Franklin, New Jersey, United States |
| white cream (light orange reflection) | 273 | production process:<br>4 g of zincite + 50 ml sulphuric acid / soaking: 2 wk. / drying on hot plate |
| white (cream reflection) | 274 | production process:<br>0↑1900 °F (black): .40 g + 50 ml sulphuric acid / soaking: 2 wk. / drying on hot plate |
| white (yellow reflection) | | |
| | | mineral : labradorite<br>rock : bluish green<br>powder : light grey (light green tone)<br>origin : Chicoutimi county, Québec |
| white (very, very light yellow reflection) | 275 | production process:<br>2 g of labradorite + 20 ml hydrofluoric acid / soaking: 24 h / drying in a drying oven at 100 °F |
| | 276 | mineral : amethyst<br>rock : violet, translucid<br>powder : light grey (lilac tone)<br>origin : Thunderbay, Ontario<br><br>mineral : sulphur<br>rock : brilliant yellow<br>powder : brilliant yellow<br>origin : unknown |

| | | |
|---|---|---|
| white (light grey and yellow reflections) | 277 | production process:<br>2 g of amethyst + 2 g of sulphur / 1300 °F / 1 h[42] |
| white (yellow reflection) | 278 | mineral : blue lace agate<br>rock : light violet-blue, slightly translucid<br>powder : very light grey<br>origin : Africa<br><br>production process:<br>(followed from «white [grey reflection]»)<br>1600 °F / 1 h (chalk-white) / rock irradiated with gamma rays at 424.7 Mrad |
| almost pure white (light yellow reflection) | 279 | mineral : asbestos[4]<br>rock : dark grey (green reflection)<br>powder : light grey (green reflection)<br>origin : Asbestos Corporation Ltd., Thetford Mines, Québec<br><br>procédé de production:<br>5 g of asbestos + 100 ml sulphuric acid / soaking: 2 wk. / drying on hot plate |
| white (yellow reflection) | 280 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>rock hermetically wrapped up in bread dough / irradiated with gamma rays at 5.7 Mrad |
| white (light yellow reflection) | 281 | production process:<br>rock irradiated with gamma rays at 122.984 Mrad[43]<br><br>(followed at «light beige») |
| white (light yellow reflection) | 282 | mineral : andulusite<br>rock : light brownish grey<br>powder : light grey<br>origin : Bimbowrie, Southern Australia<br><br>production process:<br>0↑1900 °F (light beige): 1 g + 50 ml nitric acid / soaking: 2 wk. / separation of the liquid and the solid / drying on hot plate / colour of the liquid[44] |

38

| | | |
|---|---|---|
| white (very, very light yellow reflection) | 283 | production process: 0↑1900 °F (light beige): 1 g + 50 ml nitric acid / soaking: 2 wk. / separation of the liquid and the solid / drying on hot plate (colour of the solid: very light yellowish beige) / irradiated with electrons at 302,831 rad[36] |
| white (yellow or beige reflection) | 284 | mineral : anorthosite<br>rock : dark grey<br>powder : medium grey<br>origin : Jonquière, Lac Saint-Jean, Québec<br><br>production process: 0↑1900 °F (medium brown): .30 g + 50 ml sulphuric acid / soaking: 2 wk. / separation of the liquid and the solid / drying on hot plate (colour of the liquid: white) / irradiated with electrons at 162,431 rad (followed at «light yellowish beige») |
| | 285 | mineral : apatite<br>rock : light grass-green (light blue and yellow tones), very slightly translucid<br>powder : very light grey (light green tone)<br>origin : region of Buckingham, Québec |
| white (light yellow reflection) | 286 | production process: 3 g of apatite + 20 ml hydrochloric acid / soaking: 3 d. / drying on hot plate |
| white (yellow reflection) | 287 | production process: 3 g of apatite + 20 ml nitric acid / soaking: 3 d. / drying on hot plate |
| white (with localized reflection) | 288 | mineral : sodium carbonate<br>powder : white<br><br>production process: (followed from «white») 1500 °F / 1 h (cream) / irradiated with gamma rays at 424.7 Mrad |
| | 289 | mineral : zirconium silicate<br>powder : white (very light yellow reflection)<br>origin : Sial Company, Québec |
| white (very, very light yellow reflection) [almost pure white] | 290 | production process: irradiated with electrons at 302,831 rad[36] |

| | | |
|---|---|---|
| white (yellow reflection) | 291 | mineral : apophyllite<br>rock : milky white, translucid<br>powder : white<br>origin : Gaspé Copper Mine, Gaspé, Québec<br><br>production process:<br>rock hermetically wrapped up in bread dough / irradiated with gamma rays at 4.88 Mrad |
| white (yellow or beige or pink reflection) | 292 | production process:<br>powder irradiated with electrons[65] at 162,431 rad<br><br>(followed at «white [grey reflection]») |
| white (light yellow reflection) | 293 | mineral : barite<br>rock : pinkish white<br>powder : white<br>origin : Niobec Mine, Saint-Honoré, Saguenay, Québec<br><br>production process:<br>4 g of barite + 50 ml nitric acid / soaking: 2 wk. / drying on hot plate |
| white (with a thin layer of yellow particles on the surface) | 294 | production process:<br>0↑1900 °F |
| cristalline white (yellow reflection) | 295 | production process:<br>rock irradiated with gamma rays at 65.704 Mrad<br><br>(followed at «yellow») |
| white (yellow reflection) | 296 | mineral : beryl<br>rock : very light yellowish green, slightly translucid<br>powder : white (green reflection)<br>origin : Lacorne district, Abitibi, Québec<br><br>production process:<br>1000 °C / 1 h (white [very light pinkish beige reflection]) / powder irradiated with gamma rays at 63.984 Mrad<br>(followed at «very light grey») |
| | | mineral : calcite[11]<br>powder : white<br>origin : Calcite du Nord Company, Saint-Eugène de Mistassini, Lac Saint-Jean, Québec |

| | | |
|---|---|---|
| white (light yellow reflection) | 297 | <u>production process:</u><br>4 g of calcite + 20 ml hydrofluoric acid / soaking: 24 h / drying in drying oven at 100 °F |
| | | <u>production process:</u><br>powder irradiated with gamma rays at: |
| white [which takes progressively | 298 | 5 Mrad |
| a light yellow or | 299 | 10 Mrad |
| grey or blue reflection] | 300 | 57.4 Mrad |
| ↓ | | |
| white (yellow or grey or blue reflection) | 301 | 64.7 Mrad |
| ↓ which | 302 | 102.4 Mrad |
| becomes | 303 | 148.4 Mrad |
| progressively | 304 | 201.6 Mrad |
| ↓ | 305 | 247.6 Mrad |
| ↓ | 306 | 287.3 Mrad |
| a beige | 307 | 360 Mrad |
| reflection | 308 | 424.7 Mrad |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, metallic luster<br><br><u>production process:</u> |
| white (yellow reflection) | 309 | 1.50 g of calcite + .50 g of chrome / 1000 °F / 1 h |
| ↓ | | |
| white (yellow reflection more accentuated) | 310 | 1.50 g of calcite + .50 g of chrome / 1100 °F / 1 h |
| ↓ | | |
| white (yellow reflection still more accentuated) | 311 | 1.50 g of calcite + .50 g of chrome / 1200 °F / 1 h<br>(followed at «light yellow») |
| | | mineral : calcite (with clayey inclusions)<br>rock : very light creamy yellow, translucid<br>powder : white<br>origin : De-Mix quarry, near Saint-Philippe de Laprairie, Québec |

41

| | | |
|---|---|---|
| white (yellow reflection) | 312 | production process:<br>0↑1600 °F + 15 h at 1600 °F (medium accentuated beige [pinkish orange tone]): 2 g + 40 ml nitric acid / natural drying (white) / irradiated with gamma rays at 63.88 Mrad |
| white (yellow reflection) | 313 | production process:<br>rock hermetically wrapped in bread dough / 1600 °F / 1 h (white [slightly translucid]) / irradiated with gamma rays at 64.7 Mrad<br>(followed at «medium honey») |
| white (yellow reflection) | 314 | mineral : cerite<br>rock : dark brownish grey<br>powder : light grey (light brown tone)<br>origin : Jamestown, Boulder county, Colorado, United States<br><br>production process:<br>4 g of cerite + 100 ml sulphuric acid / soaking: 2 wk. / drying on hot plate (white) / irradiated with gamma rays at 64.7 Mrad<br>(followed at «light greyish beige») |
| white (with yellowish areas)<br>↓<br>white (with yellow particles) | 315<br><br>316 | mineral : cryolite<br>rock : white, crystalline and translucid<br>powder : white<br>origin : Ivigtut, Groenland<br><br>production process:<br>0↑1600 °F<br><br>0↑1900 °F |
| white (light yellow reflection) | 317 | production process:<br>0↑1600 °F (white [with yellowish areas]): .20 g + 50 ml nitric acid / soaking: 2 wk. / drying on hot plate |
| white (light yellow reflection) | 318 | production process:<br>4 g of cryolite + 50 ml hydrochloric acid / soaking: 2 wk. / drying on hot plate |
| | 319 | mineral : cryolite<br>rock : white, crystalline and translucid<br>powder : white<br>origin : Ivigtut, Groenland<br><br>mineral : zinc<br>powder : medium grey, metallic brilliance |

| | | |
|---|---|---|
| white (light yellow reflection)<br>↓<br>white (light yellow reflection) | 320<br><br>321 | production process:<br>3 g of cryolite + 2 g of zinc / 1700 °F / 15 min.<br><br>3 g of cryolite + 2 g of zinc / 1900 °F / 1 h |
| white (yellow reflection) | 322 | mineral : dolomite<br>rock : white (localized yellow reflection), crystalline and translucid<br>powder : white<br>origin : Bristol district, Pontiac county, Québec<br><br>production process:<br>2 g of dolomite + 20 ml hydrofluoric acid / soaking: 24 h / drying in drying oven at 100 °F |
| white (light yellow reflection) | 323 | production process:<br>1000 °C / 1 h |
| yellowish white (light grey reflection) | 324 | mineral : dolomite<br>rock : white (localized yellow reflection), crystalline and translucid<br>powder : white<br>origin : Bristol district, Pontiac county, Québec<br><br>mineral : sulphur<br>rock : brilliant yellow<br>powder : brilliant yellow<br>origin : unknown<br><br>production process:<br>2 g of dolomite + 2 g of sulphur / 1300 °F / 1 h |
| white (light yellow reflection) | 325 | mineral : fluorine<br>rock : violet and white, translucid<br>powder : very light grey<br>origin : Saint-Lawrence Fluorspar Company, Saint-Lawrence, Newfoundland<br><br>production process:<br>1000 °C / 1 h |
| | | mineral : calcite[11]<br>powder : white<br>origin : Calcite du Nord Company, St.-Eugène de Mistassini, Lac Saint-Jean, Québec |

| | | |
|---|---|---|
| white (light yellow reflection) | 326 | mineral : fluorine<br>rock : violet and white, translucid<br>powder : very light grey<br>origin : Saint-Lawrence Fluorspar Company, Saint-Lawrence, Newfoundland<br><br>production process:<br>1 g of calcite + 1 g of fluorine / 1000 °C / 1 h |
| white (light yellow reflection) | 327 | mineral : calcite[11]<br>powder : white<br>origin : Calcite du Nord Company, St.-Eugène de Mistassini, Lac Saint-Jean, Québec<br><br>mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>1 g of calcite + 1 g of fluorine / 1000 °C / 1 h |
| white (light yellow reflection) | 328 | mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>1000 °C / 1 h |
| white (light yellow reflection) | 329<br>330 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>0↑1000 °C |
| white (light yellow reflection) | 331 | production process:<br>1000 °C / 1 h |
| white (light yellow reflection) | 332 | production process:<br>2 g of fluorine + 20 ml phosphoric acid / soaking: 3 d. / drying on hot plate (still humid) |

| | | |
|---|---|---|
| white (very light yellow reflection) | 333 | production process: 2 g of fluorine + 20 ml hydrochloric acid / soaking: 3 d. / drying on hot plate |
| white (light yellow reflection) | 334 | production process: powder irradiated with gamma rays at 65.704 Mrad (followed at «light pinkish beige») |
| white (yellow reflection) | 335 | production process: 2 g of fluorine + 20 ml ether / natural drying |
| white (yellow reflection) | 336 | production process: 2 g of fluorine + 20 ml ether / natural drying (white [yellow reflection]) / irradiated with gamma rays at 18.85 Mrad |
| white (accentuated yellow reflection) | 337 | mineral : gypsum<br>rock : white (yellow reflection)<br>powder : white (yellow reflection)<br>origin : Beisborough, Nova Scotia<br><br>production process: powder irradiated with gamma[66] rays at 244.53 Mrad<br>(followed at «light orange-beige») |
| white (yellow reflection a bit more accentuated)<br>↓ | 338 | production process: rock irradiated with gamma[67] rays at:<br>65.704 Mrad |
| white (yellow reflection still a bit more accentuated) | 339 | 124.704 Mrad<br>(followed at «light beige») |
| white (light yellow reflection) | 340 | production process: 1000 °C / 1 h |
| chalk-white (light yellow reflection) | 341 | production process: 2 g of gypsum + 20 ml hydrochloric acid / soaking: 3 d. / drying on hot plate |
| white (accentuated yellow or beige reflection) | 342 | production process: rock irradiated with electrons at 164,800 rad (followed at «very, very light yellow») |

| | | |
|---|---|---|
| white (light yellow reflection) | 343 | mineral : halite[41]<br>rock : colourless<br>powder : colourless<br>origin : Seleine Mine, Iles-de-la-Madeleine, Québec<br><br>production process:<br>1000 °C / 1 h |
| transparent white (light yellow reflection) | 344 | production process:<br>2 g of halite + 20 ml hydrochloric acid / soaking: 3 d. / drying on hot plate |
| white (yellow reflection) | 345 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 20 ml hydrofluoric acid / soaking: 24 h / drying in drying oven at 100 °F (white) / irradiated with gamma rays at 64.7 Mrad (followed at «mixture of particles: light beige / white / dark chocolate brown / medium milky chocolate-brown») |
| white (yellow reflection a bit more accentuated than «natural chalk-white [yellow reflection]») | 346 | mineral : kaolin<br>rock : chalk-white (yellow reflection)<br>powder : chalk-white (yellow reflection)<br>origin : Saint-Rémi d'Amherst, Québec<br><br>production process:<br>powder irradiated with gamma[68] rays at:<br>65.704 Mrad |
| ↓<br>white more pure | 347 | 124.704 Mrad<br>(followed at «white, almost pure [very, very light beige reflection]») |
| | | mineral : kaolin<br>rock : chalk-white (yellow reflection)<br>powder : chalk-white (yellow reflection)<br>origin : Saint-Rémi d'Amherst, Québec |

46

| | | |
|---|---|---|
| chalk-white (light yellow reflection) | 348 | mineral : sulphur<br>rock : brilliant yellow<br>powder : brilliant yellow<br>origin : unknown<br><br>production process:<br>2 g of kaolin + 2 g of sulphur / 1300 °F / 1 h |
| white (yellow reflection) | 349 | mineral : kaolin<br>rock : chalk-white (yellow reflection)<br>powder : chalk-white (yellow reflection)<br>origin : Saint-Rémi d'Amherst, Québec<br><br>production process:<br>3 g of kaolin + 50 ml nitric acid / soaking: 2 wk. / drying on hot plate (white) / irradiated with gamma rays at 64.7 Mrad<br>(followed at «light beige») |
| white (yellow or pink reflection) | 350 | production process:<br>3 g of kaolin + 50 ml sulphuric acid / soaking: 2 wk. / drying on hot plate (white) / irradiated with gamma rays at 64.7 Mrad<br>(followed at «medium orange-beige») |
| | | mineral : microcline<br>rock : white (grey reflection)<br>powder : white (grey reflection)<br>origin : Buckingham, Québec<br><br>production process:<br>granules irradiated with gamma rays at: |
| white (yellow reflection) | 351 | 5 Mrad |
| white (yellow reflection a bit more accentuated) | 352 | 10 Mrad |
| white (yellow reflection still a bit more accentuated) | 353 | 57.4 Mrad |
| white (yellow reflection a bit more accentuated) | 354 | 65.704 Mrad |
| white (yellow reflection still | 355 | 102.4 Mrad |

| | | |
|---|---|---|
| a bit more accentuated)<br>↓ | | |
| white (yellow reflection a bit more accentuated)<br>↓ | 356 | 148.4 Mrad |
| white (yellow reflection still a bit more accentuated) | 357 | 201.6 Mrad[69]<br><br>(followed at «light yellow ochre») |
| white (pronounced yellow reflection) | 358 | mineral : amazon stone<br>rock : light greenish turquoise, translucid<br>powder : white (turquoise reflection)<br>origin : unknown<br><br>production process:<br>4 g of amazon + 40 ml hydrochloric acid / soaking: 1 wk. / separation of the liquid and the solid / natural drying (colour of the solid: white [apple-green reflection]) / irradiated with electrons at 164,800 rad<br>(followed at «mixture of particles: mint-green / grey-beige») |
| chalk-white (light yellow reflection) | 359 | mineral : amazon stone<br>rock : light greenish turquoise, translucid<br>powder : white (turquoise reflection)<br>origin : unknown<br><br>mineral : sulphur<br>rock : brilliant yellow<br>powder : brilliant yellow<br>origin : unknown<br><br>production process:<br>2 g of amazon + 2 g of sulphur / 1300 °F / 1 h |
| white (light yellow reflection) | 360 | mineral : orthoclase<br>rock : white (grey reflection)<br>powder : white (grey reflection)<br>origin : mine near Buckingham, Papineau county, Québec<br>production process:<br>2 g of orthoclase + 20 ml hydrochloric acid / soaking: 3 d. / drying on hot plate |
| white (light yellow reflection) | 361 | production process:<br>2 g of orthoclase + 20 ml nitric acid / soaking: 3 d. / drying on hot plate |

| | | |
|---|---|---|
| white (light yellow reflection) | 362 | <u>production process:</u><br>1000 °C / 1 h |
| white (light yellow or beige reflection) | 363 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>4 g of pyrrhotite + 50 ml sulphuric acid / soaking: 2 wk. / drying on hot plate |
| white (light creamy yellow or beige reflection) | 364 | <u>production process:</u><br>(followed from «mixture of particles: white / greenish grey»)<br>4 g of pyrrhotite + 50 ml nitric acid / soaking: 2 wk. / separation of the liquid and the solid / natural drying (colour of the solid: mixture of particles: white / greenish grey) / irradiated with electrons at 302,831 rad[36] |
| white (yellow reflection) | 365 | mineral : quartz (with impurities of white kaolinite)<br>rock : opaline white, slightly translucid<br>origin : quarry near Saint-Rémi d'Amherst, Québec<br><br><u>production process:</u><br>1500 °F / 1 h (white [more white and a bit more opaque than «opaline white»]) / rock irradiated with gamma rays at 64.7 Mrad<br>(followed at «2 areas: honey-yellow / grey») |
| white (light yellow reflection) | 366<br>366.1 | mineral : siderite<br>rock : caramel-brown (grey tone)<br>powder : light orange-beige<br>origin : De-Mix quarry, North side of Mont Saint-Hilaire, Rouville county, Québec<br><br><u>production process:</u><br>3 g of siderite + 20 ml sulphuric acid / soaking: 3 d. / drying on hot plate |
| | 367 | mineral : steatite<br>rock : light cold grey, slightly translucid<br>powder : light grey<br>origin : East Broughton, Québec |

49

| | | |
|---|---|---|
| white (yellow reflection) | 368 | production process:<br>2 g of steatite + 2 g of sodium carbonate / 0↑1500 °F + 1 h at 1500 °F<br>(followed at «very light creamy yellow») |
| | | mineral : steatite<br>rock : light evergreen<br>powder : white<br>origin : East Broughton, Québec |
| white (light yellow reflection) | 369 | production process:<br>2 g of steatite + 20 ml nitric acid / soaking: 3 d. / natural drying |
| white almost pure (very, very light yellow reflection) | 370 | production process:<br>2 g of steatite + 20 ml nitric acid / soaking: 3 d. / natural drying (white [light yellow reflection]) / irradiated with electrons at 302,831 rad[36] |
| | | mineral : stilbite<br>rock : white (honey-yellow reflection)<br>powder : white (honey-yellow reflection)<br>origin : Lac d'amiante Mine, Black Lake, Québec |
| white (light yellow reflection) | 371 | production process:<br>1500 °F / 1 h (chalk-white [orange reflection]): .50 g + 40 ml nitric acid / natural drying |
| white (very light yellow reflection) | 372 | production process:<br>1500 °F / 1 h (chalk-white [orange reflection]): .50 g + 40 ml hydrochloric acid / natural drying |
| | | mineral : sphalerite[31]<br>rock : honey-yellow<br>powder : pale honey-yellow<br>origin : Fédéral Mine, Lemieux district, Gaspésie, Québec |
| white (light yellow reflection) | 373 | production process:<br>1 g of sphalerite + 25 ml nitric acid / it bubbles as soon as the mineral is put in the acid / immediately after the bubbling, separation of the liquid and the solid / immediate drying on hot plate / colour of the liquid[70] |
| | | mineral : obsidian<br>rock : very dark smoky grey, almost black<br>powder : light grey<br>origin : Arkansas, United States |

| | | |
|---|---|---|
| white (light yellow reflection) | 374 | production process:<br>2 g of obsidian + 20 ml phosphoric acid / soaking: 3 d. / drying on hot plate (still humid) |
| white (orange reflection) | | |
| | | mineral : apophyllite<br>rock : milky white, translucid<br>powder : white<br>origin : Gaspé Copper Mine, Gaspé, Québec<br><br>production process:<br>(followed from «milky white [light beige reflection]»)<br>rock irradiated with gamma rays at: |
| milky white (very light orange reflection) | 375 | 37.4 Mrad |
| ↓ | | |
| milky white (very light orange reflection) | 376 | 64.7 Mrad[71]<br><br>(followed at «light orange») |
| white (orange reflection) | 377 | mineral : calcite (with clayey inclusions)<br>rock : very light creamy yellow, translucid<br>powder : white<br>origin : De-Mix quarry, near Saint-Philippe de Laprairie, Québec<br><br>production process:<br>0↑1600 °F + 15 h at 1600 °F (accentuated medium [pinkish orange tone]): 2 g + 40 ml hydrochloric acid / soaking: 20 d. / drying on hot plate |
| white (orange reflection) | 378 | mineral : cryolite<br>rock : white, crystalline and translucid<br>powder : white<br>origin : Ivigtut, Groenland<br>production process:<br>4 g of cryolite + 50 ml nitric acid / soaking: 2 wk. / drying on hot plate |
| chalk-white (with orange areas) | 379 | mineral : fluorine<br>rock : pinkish lilac, opaque<br>powder : very light grey (lilac tone), almost white<br>origin : Saint-Lawrence Fluorspar Company, Saint-Lawrence, Newfoundland<br>production process:<br>rock hermetically wrapped in bread dough / 1600 °F / 1 h[133] |

51

| | | |
|---|---|---|
| chalk-white (orange reflection) | 380 | mineral : stilbite<br>rock : white (honey reflection)<br>powder : white (honey reflection)<br>origin : Lac d'amiante Mine, Black Lake, Québec<br><br><u>production process:</u><br>1500 °F / 1 h |
| white (pink reflection) | | |
| white (pink reflection) | 381 | mineral : barite<br>rock : pinkish white<br>powder : white<br>origin : Niobec Mine, St.-Honoré, Saguenay, Québec<br><br><u>production process:</u><br>4 g of barite + 50 ml phosphoric acid / soaking: 2 wk. / drying on hot plate (still humid)[72] |
| white (light pink reflection) | 382 | mineral : calcite[11]<br>powder : white<br>origin : Calcite du Nord Company, Saint-Eugène de Mistassini, Lac Saint-Jean, Québec<br><br>mineral : orthoclase<br>rock : light pinkish beige<br>powder : very light beige<br>origin : mine near Buckingham, Papineau county Québec<br><br><u>production process:</u><br>1 g of calcite + 1 g of orthoclase / 1000 °C / 1 h |
| white (pink reflection) | 383 | mineral : cryolite<br>rock : white, crystalline and translucid<br>powder : white<br>origin : Ivigtut, Groenland<br><br><u>production process:</u><br>4 g of cryolite + 50 ml sulphuric acid / soaking: 2 wk. / drying on hot plate (white) / irradiated with gamma rays at 64.7 Mrad (followed at «light beige [light pink tone]») |
| white (very light pink reflection) | 384 | <u>production process:</u><br>0†1600 °F (white [with yellowish areas]): .20 g + 50 ml sulphuric acid / soaking: 2 wk. / |

52

| | | |
|---|---|---|
| | | drying on hot plate |
| milky white (pink reflection) | 385 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate |
| white (light pink reflection) | 386 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>1000 °C / 1 h |
| white (pink reflection very, very slightly accentuated) | 387 | production process:<br>1000 °C / 1 h (white [light pink reflection]) / powder irradiated with gamma rays at 64.7 Mrad<br><br>(followed at «orange [pink and beige tones]») |
| white (pink reflection very, very slightly accentuated) | 388 | production process:<br>powder irradiated with electrons at 302,831 rad[34] |
| white (light pink or orange reflection) | 389 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>1000 °C / 1 h |
| white (very light pink reflection) | 390 | production process:<br>1000 °C / 1 h (white [light pink or orange reflection]) / powder irradiated with electrons at 302,831 rad[45] |
| | | mineral : fluorine<br>rock : very pale yellow, translucid<br>powder : white (light yellow reflection)<br>origin : Ohio, United States |

53

| | | |
|---|---|---|
| white (pink reflection) | 391 | <u>production process:</u><br>1500 °F / 1 h (white [half opaque]) / rock irradiated with electrons at 305,200 rad[73] |
| white [half opaque] (orange pink reflection) | 392 | mineral : fluorine<br>rock : very light fluor-green (cold mint-green type), translucid<br>powder : very light grey<br>origin : Rogers Mine, Madoc, Ontario<br><br><u>production process:</u><br>1500 °F / 1 h |
| white (light pink reflection) | 393 | mineral : kaolin<br>rock : chalk-white (yellow reflection)<br>powder : chalk-white (yellow reflection)<br>origin : Saint-Rémi d'Amherst, Québec<br><br><u>production process:</u><br>0↑1900 °F |
| white (accentuated pink reflection) | 394 | <u>production process:</u><br>0↑1900 °F (white [light pink reflection]): .20 g + 25 ml sulphuric acid / soaking: 2 wk. / drying on hot plate |
| | 395 | mineral : vesuvianite<br>rock : lilac<br>powder : lilac<br>origin : John Mansville Mine, Asbestos, Québec |
| white (pink reflection) | 396 | <u>production process:</u><br>(followed from «white [grey reflection]»)<br>0↑1300 °F<br>(followed at «very light pink») |
| white (pink reflection) | 397 | <u>production process:</u><br>12 g of vesuvianite + 40 ml sulphuric acid / soaking: 10 d. / drying on hot plate |
| white (beige reflection) | | |
| white [almost | 398 | mineral : labradorite<br>rock : bluish green<br>powder : light grey (light green tone)<br>origin : Chicoutimi county, Québec<br><br><u>production process:</u><br>2 g of labradorite + 20 ml hydrofluoric acid / |

54

| | | |
|---|---|---|
| pure] (light beige reflection) | | soaking: 24 h / drying in a drying oven at 100 °F (white [very, very light yellow reflection]) / irradiated with electrons at 302,831 rad[239] |
| white (very, very light pinkish beige or pinkish grey reflection) | 399 | mineral : fluorine<br>rock : colourless<br>powder : colourless<br>origin : unknown<br><br>production process:<br>2 g of fluorine + 20 ml hydrofluoric acid / soaking: 24 h / drying in a drying oven at 100 °F (white cream [light grey reflection]) / irradiated with electrons at 302,831 rad[36] |
| white (beige or grey reflection) | 400 | mineral : blue lace agate<br>rock : light violet-blue, slightly translucid<br>powder : very light grey<br>origin : Africa<br><br>production process:<br>rock hermetically wrapped in bread dough / 1600 °F / 1 h (white, opaque) / irradiated with gamma rays at 64.7 Mrad<br>(followed at «light beige») |
| | | mineral : andulusite<br>rock : light brownish grey<br>powder : light grey<br>origin : Bimbowrie, Southern Australia<br><br>production process:<br>0↑1900 °F (light beige): 1 g + 50 ml nitric acid / soaking: 2 wk. / separation of the liquid and the solid / drying on hot plate (colour of the solid: very light beige [yellow tone]) / irradiated with electrons at: |
| white (very light beige reflection)<br>↓ | 401 | 162,431 rad |
| white (very light beige reflection) | 402 | 302,831 rad[45] |
| white (diminished beige reflection) | 403 | production process:<br>0↑1900 °F (light beige): 1 g + 50 ml sulphuric acid / soaking: 2 wk. / separation of the liquid and the solid / drying on hot plate (colour of the solid: white [beige reflection]) / irradiated with electrons at 302,831 rad[36] |

55

| | | |
|---|---|---|
| white (beige reflection) | 404 | production process:<br>0↑1900 °F (light beige): 1 g + 50 ml sulphuric acid / soaking: 2 wk. / separation of the liquid and the solid / drying on hot plate / colour of the solid[455] |
| | | mineral : apophyllite<br>rock : milky white, translucid<br>powder : white<br>origin : Gaspé Copper Mine, Gaspé, Québec<br><br>production process:<br>rock irradiated with gamma rays at: |
| milky white (light beige reflection)<br>↓ | 405 | 5 Mrad |
| milky white (accentuated beige reflection) | 406 | 10 Mrad<br>(followed at «milky beige [very light orange reflection]») |
| white (beige or grey reflection) | 407 | production process:<br>(followed from «white [brownish or greyish amber reflection]»)<br>rock irradiated with electrons at 305,200 rad[73] |
| white (light grey or beige reflection) | 408 | mineral : armenite<br>rock : light grey<br>powder : very light grey<br>origin : Abitibi, Québec<br><br>production process:<br>1 g of armenite + 50 ml sulphuric acid / soaking: 2 wk. / drying on hot plate |
| white (beige reflection) | 409 | mineral : labradorite<br>rock : bluish green<br>powder : light grey (light green tone)<br>origin : Chicoutimi county, Québec<br><br>production process:<br>2 g of labradorite + 20 ml hydrofluoric acid / soaking: 24 h / drying in a drying oven at 100 °F (white [very, very light yellow reflection]) / irradiated with gamma rays at 64.7 Mrad (followed at «medium beige») |
| | 410 | mineral : beryl<br>rock : light blue (near turquoise), slightly translucid<br>powder : light grey<br>origin : Lacorne district, Abitibi, Québec |

| | | |
|---|---|---|
| white more pure (light beige or grey reflection) | 411 | <u>production process:</u><br>1600 °F / 1 h (white [bluish grey reflection]) / irradiated with electrons at 302,831 rad³⁶ |
| white (very light pinkish beige reflection) | 412 | mineral : beryl<br>rock : very light yellowish green, slightly translucid<br>powder : white (green reflection)<br>origin : Lacorne district, Abitibi, Québec<br><br><u>production process:</u><br>1000 °C / 1 h |
| | 413 | mineral : titanium dioxide #2160<br>powder : white<br>origin : NL Chem Canada Inc., Québec<br><br><u>production process:</u><br>irradiated with gamma rays at: |
| white (beige reflection) | 414 | 5 Mrad |
| \| | 415 | 5.7 Mrad |
| \| | 416 | 10 Mrad |
| ↓ | 417 | 57.4 Mrad |
| white (beige reflection which is accentuated slightly at each step) | 418 | 102.4 Mrad |
| | 419 | 201.6 Mrad |
| | 420 | 247.6 Mrad |
| | 421 | 287.3 Mrad |
| | 422 | 360 Mrad<br>(followed at «very, very light chamois») |
| white (light beige or grey reflection) | 423<br>424 | mineral : titanium dioxide #Tx-2071-4<br>powder : white<br>origin : NL Chem Canada Inc., Québec<br><br><u>production process:</u><br>irradiated with electrons at 302,831 rad³⁶ |
| white (light beige or grey reflection) | 425 | mineral : titanium dioxide #2160<br>powder : white<br>origin : NL Chem Canada Inc., Québec<br><br><u>production process:</u><br>irradiated with electrons at 302,831 rad³⁶ |
| | 426 | mineral : titanium dioxide #2101-1 |

57

| | | |
|---|---|---|
| | | powder : white<br>origin : NL Chem Canada Inc., Québec |
| white (light beige or grey reflection) | 427 | production process:<br>irradiated with electrons at 302,831 rad[36] |
| | 428 | mineral : titanium dioxide #2101<br>powder : white<br>origin : NL Chem Canada Inc., Québec |
| white (light beige or grey reflection) | 429 | production process:<br>irradiated with electrons at 302,831 rad[36] |
| | 430 | mineral : titanium dioxide #1000<br>powder : white<br>origin : NL Chem Canada Inc., Québec |
| white (light beige or grey reflection) | 431 | production process:<br>irradiated with electrons at 302,831 rad[36] |
| | | mineral : titanium dioxide #2073<br>powder : white<br>origin : NL Chem Canada Inc., Québec |
| white (light beige or grey reflection) | 432 | production process:<br>irradiated with electrons at 302,831 rad[36] |
| | 433 | mineral : titanium dioxide #2020<br>powder : white<br>origin : NL Chem Canada Inc., Québec |
| white (light beige or grey reflection) | 434 | production process:<br>irradiated with electrons at 302,831 rad[36] |
| | 435 | mineral : titanium dioxide #2071<br>powder : white<br>origin : NL Chem Canada Inc., Québec |
| white (light beige or grey reflection) | 436 | production process:<br>irradiated with electrons at 302,831 rad[36] |

| | | |
|---|---|---|
| white (light grey or beige reflection) | 437 | mineral : zirconium silicate<br>powder : white (very light yellow reflection)<br>origin : Compagnie Sial, Québec<br><br>production process:<br>irradiated with gamma rays at 360 Mrad |
| white (more accentuated beige or grey reflection) | 438 | mineral : calcite[11]<br>powder : white<br>origin : Calcite du Nord Company, Saint-Eugène de Mistassini, Lac Saint-Jean, Québec<br><br>production process:<br>8 g of calcite + 50 cc of transparent polyester resin + 1% of catalyst / manual grinding / moulding / hardening (white [beige or grey reflection]) / irradiated with electrons at 155,082 rad[74]<br>(followed at «greyish brown [light green reflection]») |
| white (light beige reflection) | 439 | mineral : fluorescent calcite<br>rock : white (localized grey or brown reflection), translucid<br>powder : white (yellow reflection)<br>origin : Bancroft, Ontario<br><br>production process:<br>4 g of calcite + 20 ml sulphuric acid / soaking: 3 d. / drying on hot plate |
| white (beige reflection) | 440 | mineral : calcite (with clayey inclusions)<br>rock : very light creamy yellow, translucid<br>powder : white<br>origin : De-Mix quarry, near Saint-Philippe de Laprairie, Québec<br><br>production process:<br>4 g of calcite + 40 ml nitric acid / soaking: 1 wk. / drying on hot plate |
| white (with beige particles) | 441 | production process:<br>0↑1600 °F + 15 h at 1600 °F (medium and accentuated beige [pinkish orange tone]): 2 g + 40 ml nitric acid / natural drying |
| | | mineral : calcite<br>rock : light pink<br>powder : pinkish white<br>origin : Huddersfield district, Pontiac county, |

| | | |
|---|---|---|
| white (beige reflection) | 442 | Québec<br><br>production process:<br>powder irradiated with gamma rays at 64.7 Mrad[619]<br>(followed at «light beige») |
| white (beige reflection) | 443 | mineral : cryolite<br>rock : white, crystalline and translucid<br>powder : white<br>origin : Ivigtut, Groenland<br><br>production process:<br>2 g of cryolite + 2 g of sodium carbonate<br>/ 0↑1500 °F + 1 h at 1500 °F<br>(followed at «very clear grey») |
| white (beige reflection) | 444 | production process:<br>0↑1600 °F (white [with yellowish areas]):<br>.20 g + 50 ml nitric acid / soaking: 2 wk. /<br>drying on hot plate (white [light yellow reflection]) / irradiated with gamma rays at 64.7 Mrad<br>(followed at «medium beige») |
| white (light beige reflection) | 445 | mineral : diopside<br>rock : light grey<br>powder : light beige<br>origin : Mont Orford, Québec<br><br>production process:<br>1 g of diopside + 50 ml sulphuric acid / soaking:<br>2 wk. / drying on hot plate |
| white (beige reflection) | 446 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml ammonia / natural drying |
| white (pinkish beige reflection) | 447 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>2 g of fluorine + 20 ml sulphuric acid / soaking:<br>3 d. / drying on hot plate |

60

| | | |
|---|---|---|
| white (very light beige reflection) | 448 | mineral : hornblende<br>rock : medium evergreen (light grey tone), with a vitreous brilliance<br>powder : medium cold grey (light green tone)<br>origin : Abitibi, Québec<br><br><u>production process:</u><br>3 g of hornblende + 20 ml hydrofluoric acid / soaking: 24 h / drying in a drying oven at 100 °F (white) / irradiated with electrons at 302,831 rad[36] |
| white (light beige reflection) | 449 | mineral : kaolin<br>rock : chalk-white (yellow reflection)<br>powder : chalk-white (yellow reflection)<br>origin : Saint-Rémi d'Amherst, Québec<br><br><u>production process:</u><br>0↑1900 °F (white [light pink reflection]): .20 g + 25 ml nitric acid / soaking: 2 wk. / drying on hot plate |
| white, almost pure (very, very light beige reflection) | 450 | <u>production process:</u><br>(followed from «white [yellow reflection]») powder irradiated with gamma rays at 484.704 Mrad |
| white (beige or yellow reflection) | 451 | <u>production process:</u><br>(followed from «white [with «vivid yellow areas»]) 3 g of kaolin + 50 ml hydrochloric acid / soaking: 2 wk. / drying on hot plate (light lemon-yellow) / irradiated with electrons at 302,831 rad[45] |
| white (light beige reflection) | 452 | mineral : microcline<br>rock : white (grey reflection)<br>powder : white (grey reflection)<br>origin : Buckingham, Québec<br><br><u>production process:</u><br>0↑1900 °F (light grey): .50 g + 50 ml nitric acid / soaking: 2 wk. / drying on hot plate |
| white (light beige reflection) | 453 | <u>production process:</u><br>0↑1900 °F (light grey): .50 g + 50 ml sulphuric acid / soaking: 2 wk. / drying on hot plate |
| | | mineral : olivine<br>rock : light grey, crystalline |

61

| | | |
|---|---|---|
| white (very light beige reflection) | 454 | powder : very light grey<br>origin : Mont Albert, Gaspésie, Québec<br><br>production process:<br>4 g of olivine + 50 ml sulphuric acid / soaking: 2 wk. / drying on hot plate |
| white (beige and grey reflections) | 455 | mineral : orthoclase<br>rock : white (grey reflection)<br>powder : white (grey reflection)<br>origin : mine near Buckingham, Papineau county, Québec<br><br>production process:<br>rock hermetically wrapped in bread dough / 1600 °F / 1 h |
| white (beige reflection) | 456 | mineral : peridotite<br>rock : medium grey<br>powder : medium brownish grey (green reflection)<br>origin : Thetford Mines, Québec<br><br>production process:<br>4 g of peridotite + 100 ml sulphuric acid / soaking: 2 wk. / drying on hot plate |
| white (beige reflection) | 457 | mineral : pyrophillite<br>rock : light beige (grey and pink tones), opaque<br>powder : very light beige (grey and orange pink tones)<br>origin : Carpentier district, Abitibi, Québec<br><br>production process:<br>1 g of pyrophillite + 50 ml sulphuric acid / soaking: 2 wk. / drying on hot plate |
| white (beige reflection) | 458 | mineral : spodumene<br>rock : pale green<br>powder : light grey, almost white<br>origin : Québec Lithium Co., Baraute, Abitibi, Québec<br><br>production process:<br>2 g of spodumene + 80 ml nitric acid / soaking: 2 wk. / separation of the liquid and the solid / drying on hot plate / colour of the solid[75] |
| | | mineral : stibnite<br>rock : dark grey, blue and silver metallic |

62

| | | |
|---|---|---|
| | | brilliance<br>powder : dark grey<br>origin : Consolidated Durham Mine, Saint-Georges, Nouveau-Brunswick |
| white (light beige reflection) | 459 | production process:<br>1 g of stibnite + 100 ml sulphuric acid / soaking: 2 wk. / drying on hot plate |
| white almost pure (very, very light beige reflection) | 460 | production process:<br>(followed from «white»)<br>1 g of stibnite + 100 ml nitric acid / soaking: 2 wk. / separation of the liquid and the solid / drying on hot plate (colour of the solid: light creamy yellow) / irradiated with electrons at 302,831 rad[45] |
| | 461 | mineral : stibnite<br>rock : dark grey, with metallic brilliance<br>powder : dark grey, with metallic brilliance<br>origin : Hunan, China |
| white (light beige reflection) | 462 | production process:<br>5 g of stibnite + 20 ml nitric acid / soaking: 3 d. / drying on hot plate[76] |
| white (accentuated beige reflection) | 463 | production process:<br>5 g of stibnite + 20 ml nitric acid / soaking: 3 d. / drying on hot plate (white [light beige reflection]) / irradiated with gamma rays at 64.7 Mrad<br>(followed at «mixture of particles: light beige / medium beige») |
| | | mineral : stilbite<br>rock : white (honey reflection)<br>powder : white (honey reflection)<br>origin : Lac d'amiante Mine, Black Lake, Québec |
| white (beige reflection) | 464 | production process:<br>3 g of stilbite + 40 ml sulphuric acid / soaking: 16 d. / drying on hot plate |
| white more pure and luminous (very light beige or pink reflection) | 465 | production process:<br>1500 °F / 1 h (chalk-white [orange reflection]) / rock irradiated with electrons at 305,200 rad[73] |
| | | mineral : vesuvianite<br>rock : lilac<br>powder : lilac |

63

| | | |
|---|---|---|
| white (beige reflection) | 466 | origin : John Mansville Mine, Asbestos, Québec<br><br>production process:<br>1600 °F / 15 h (chamois): 2 g + 40 ml sulphuric acid / soaking: 1 wk. / drying on hot plate |
| white (beige or yellow reflection) | 467 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>.50 g of wilsonite + .50 g of sodium carbonate (white) / irradiated with electrons at 162,431 rad |
| white (light beige reflection) | 468 | mineral : zinc<br>powder : medium grey, with metallic brilliance<br><br>production process:<br>70 g of zinc + 100 ml sulphuric acid / soaking: 5 mo. / natural drying completed on hot plate / colour of the liquid[77] |
| white (brown reflection) | | |
| white (grey or brownish amber reflection) | 469 | mineral : apophyllite<br>rock : milky white, translucid<br>powder : white<br>origin : Gaspé Copper Mine, Gaspé, Québec<br><br>production process:<br>rock irradiated with electrons at 164,800 rad<br><br>(followed at «white [beige or grey reflection]») |
| milky white (brown reflection) | 470 | mineral : calcite (with clayey inclusions)<br>rock : very light creamy yellow, translucid<br>powder : white<br>origin : De-Mix quarry, near Saint-Philippe de Laprairie, Québec<br><br>production process:<br>4 g of calcite + 40 ml phosphoric acid / soaking: 1 wk. / drying on hot plate (still humid) / colour of the solid[30] |
| | | mineral : solid epidote<br>rock : brownish green |

| | | |
|---|---|---|
| white (brown reflection) with blue particles | 471 | powder : brownish green<br>origin : James Bay, Québec<br><br>production process:<br>0↑1700 °F (dark reddish brown): 1 g + 40 ml sulphuric acid / soaking: 1 wk. / drying on hot plate |
| white (grey reflection) | | |
| white more pure and chalky (grey localized reflection) | 472 | mineral : blue lace agate<br>rock : light violet-blue, slightly translucid<br>powder : very light grey<br>origin : Africa<br><br>production process:<br>rock hermetically wrapped in bread dough / 1600 °F / 1 h (white, opaque) / irradiated with electrons at 305,200 rad[44] |
| white (grey reflection) | 473 | production process:<br>1600 °F / 1 h (chalk-white) / rock irradiated with gamma rays at 64.7 Mrad<br>(followed at «white [yellow reflection]») |
| white (grey reflection) | 474 | production process:<br>rock irradiated with electrons at 305,200 rad[44] |
| | 475 | mineral : amethyst<br>rock : light violet, translucid<br>origin : Lac Sairs, Témiscamingue, Québec |
| chalk-white (grey reflection) | 475.1 | production process:<br>1600 °F / 1 h |
| white (very light grey reflection) | 476 | mineral : apatite<br>rock : light grass-green (light blue and yellow tones), very slightly translucid<br>powder : very light grey (light green tones)<br>origin : region of Buckingham, Québec<br><br>production process:<br>powder irradiated with electrons at 302,831 rad[36] |
| | | mineral : apophyllite<br>rock : milky white, translucid<br>powder : white |

| | | |
|---|---|---|
| white (grey reflection) | 477 | origin : Gaspé Copper Mine, Gaspé, Québec<br><br>production process:<br>(followed from «white [yellow or beige or pink reflection]»)<br>powder irradiated with electrons at 302,831 rad[46] |
| white (grey reflection) | 478 | mineral : armenite<br>rock : light grey<br>powder : very light grey<br>origin : Abitibi, Québec<br><br>production process:<br>1 g of armenite + 50 ml nitric acid / soaking: 2 wk. / drying on hot plate (light cream [green tone]) / irradiated with electrons at 302,831 rad[46] |
| white (bluish grey reflection) | 479 | mineral : beryl<br>rock : light blue (near turquoise), slightly translucid<br>powder : light grey<br>origin : Lacorne district, Abitibi, Québec<br><br>production process:<br>1600 °F / 1 h |
| whiter white (very light greenish grey reflection) | 480 | mineral : beryl<br>rock : very light yellowish green, slightly translucid<br>powder : white (green reflection)<br>origin : Lacorne district, Abitibi, Québec<br><br>production process:<br>powder irradiated with electrons at 302,831 rad[36] |
| whiter white (grey reflection) | 481 | mineral : cryolite<br>rock : white, crystalline and translucid<br>powder : white<br>origin : Ivigtut, Groenland<br><br>production process:<br>2 g of cryolite + 2 g of sodium carbonate / / 0↑1500 °F + 1 h at 1500 °F (white [beige reflection]) / irradiated with electrons at 302,831 rad[36] |
| | | mineral : solid epidote<br>rock : brownish green<br>powder : brownish green |

| | | |
|---|---|---|
| white (greenish grey reflection) | 481.1 | origin : James Bay, Québec<br><br>production process:<br>12 g of epidote + 40 ml sulphuric acid / soaking: 22 d. / drying on hot plate |
| white (grey reflection) | 482 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml ether / natural drying (white) / irradiated with gamma rays at 18.85 Mrad |
| white (grey reflection) | 483 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml ammonia / natural drying (white [beige reflection]) / irradiated with gamma rays at 18.85 Mrad |
| white (light yellowish grey reflection) | 484 | production process:<br>2 g of fluorine + 20 ml ether / natural drying (white [yellow reflection]) / irradiated with gamma rays at 18.85 Mrad |
| white (light lilac-grey reflection) | 485 | mineral : fluorine<br>rock : pinkish lilac, opaque<br>powder : very light grey [lilac tone], almost white<br>origin : Saint-Lawrence Fluorspar Company, Saint-Lawrence, Newfoundland<br><br>production process:<br>2 g of fluorine + 20 ml ether / natural drying |
| white (light lilac-grey reflection) | 486 | production process:<br>2 g of fluorine + 20 ml ammonia / natural drying |
| | 487 | mineral : malachite<br>rock : ribboned variety of accentuated mint-green<br>powder : light and brilliant mint-green<br>origin : Katanga province, at 300 km from |

67

| | | |
|---|---|---|
| white (grey reflection) | 488 | Lubumbachai, Zaïr, Africa<br><br>production process:<br>5 g of malachite + 25 ml ammonia / natural drying (mossy green turquoise): 2 g + 20 ml phosphoric acid / soaking: 3 d. / drying on hot plate (still humid) / colour of the liquid[78] (followed at «very, very light grey [almost white]») |
| white (grey reflection) | 489 | mineral : microcline<br>rock : white (grey reflection)<br>powder : white (grey reflection)<br>origin : Buckingham, Québec<br><br>production process:<br>(followed from «white»)<br>2 g of microcline + 2 g of sodium carbonate / 0↑1400 °F + 1 h at 1400 °F<br>(followed at «light green») |
| white (diminished grey reflection) | 490 | production process:<br>powder irradiated with electrons at 302,831 rad[46] |
| white (grey reflection) | 491 | production process:<br>rock irradiated with gamma rays at 65.704 Mrad<br>(followed at «very clear brownish grey») |
| white (grey reflection) | 492 | production process:<br>rock irradiated with electrons at 162,431 rad<br>(followed at «light grey [very light beige tone]») |
| white (light grey reflection) | 493 | mineral : amazon stone<br>rock : light greenish turquoise, translucid<br>powder : white (turquoise reflection)<br>origin : unknown<br><br>production process:<br>4 g of amazon stone + 40 ml nitric acid / soaking: 1 wk. / separation of the liquid and the solid / natural drying (colour of the solid: white [light blue reflection]) / irradiated with gamma rays at 64.7 Mrad<br>(followed at «very light beige») |
| | | mineral : nickeliferous pyrrhotite[23]<br>rock : dark iron grey, with a silver and golden yellow metallic brilliance<br>powder : dark iron grey<br>origin : Inco Co., Sudbury, Ontario |

68

| | | |
|---|---|---|
| white (light grey reflection) | 494 | production process:<br>4 g of pyrrhotite + 50 ml nitric acid / soaking: 2 wk. / separation of the liquid and the solid / drying on hot plate / colour of the liquid[453] |
| | | mineral : quartz (with impurities of white kaolinite)<br>rock : opaline white, slightly translucid<br>origin : quarry near Saint-Rémi d'Amherst, Québec |
| white (grey reflection) | 495 | production process:<br>1600 °F / 1 h[80] |
| white (grey reflection a bit more accentuated) | 496 | production process:<br>1600 °F / 1 h (white [grey reflection]) / rock irradiated with electrons at 305,200 rad[73] |
| | | mineral : milky quartz<br>rock : milky white, translucid<br>origin : Adam Farm, Bonsecours, Eastern Townships, Québec<br><br>production process:<br>rock irradiated with electrons at: |
| milky white (grey or brown reflection)<br>↓ | 497 | 155,082 rad |
| milky white (grey or brown reflection)<br>↓ | 498 | 164,800 rad |
| milky white (grey reflection) | 499 | 305,200 rad[73] |
| | | mineral : quartz<br>rock : light pink, translucid<br>powder : very light grey<br>origin : unknown |
| white (grey or beige grey or greyish beige reflection) | 500 | production process:<br>4 g of quartz + 40 ml nitric acid / soaking: 7 d. / separation of the liquid and the solid / natural drying (colour of the solid: white [green reflection]) / irradiated with electrons at 305,200 rad[46] |
| | | mineral : steatite<br>rock : light evergreen |

69

| | | |
|---|---|---|
| white (very, very light grey reflection) | 501 | powder : white<br>origin : East Broughton, Québec<br><br>production process:<br>powder irradiated with electrons at 302,831 rad[36] |
| white (grey reflection) | 502 | mineral : vesuvianite<br>rock : lilac<br>powder : lilac<br>origin : John Mansville Mine, Asbestos, Québec<br><br>production process:<br>(followed from «grey [lilac tone]»)<br>0↑1200 °F<br>(followed at «white [pink reflection]») |
| white (grey reflection) | 503 | mineral : zinc<br>powder : medium grey, with metallic brilliance<br><br>production process:<br>70 g of zinc + 100 ml phosphoric acid / soaking: 3 wk. / drying on hot plate (still humid)[17] |
| white (with «vivid yellow» areas) | 504 | mineral : kaolin<br>rock : chalk-white (yellow reflection)<br>powder : chalk-white (yellow reflection)<br>origin : Saint-Rémi d'Amherst, Québec<br><br>production process:<br>3 g of kaolin + 50 ml hydrochloric acid / soaking: 2 wk. / drying on hot plate (light lemon-yellow) / irradiated with electrons at 162,431 rad<br>(followed at «white [beige or yellow reflection») |
| mixture of particles | | |
| white / greenish grey | 505 | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br>production process:<br>4 g of pyrrhotite + 50 ml nitric acid / soaking: 2 wk. / separation of the liquid and the solid / natural drying / colour of the solid[79] |
| white / greenish | 506 | production process:<br>4 g of pyrrhotite + 50 ml nitric acid / soaking: 2 |

70

| | | |
|---|---|---|
| grey more whitened than the «greenish grey» | | wk. / separation of the liquid and the solid / natural drying (colour of the solid: white / greenish grey) / irradiated with electrons at 162,431 rad (followed at «white [creamy yellow or beige reflection]») |
| | | mineral : quartz<br>rock : light pink, translucid<br>powder : very light grey<br>origin : unknown<br><br>production process:<br>4 g of quartz + 40 ml hydrochloric acid / soaking: 7 d. / separation of the liquid and the solid / natural drying (colour of the solid: light green) / irradiated with electrons at: |
| white / light green ↓ | 507 | 164,800 rad[24] |
| white / light green | 508 | 305,200 rad[24,73] |
| ivory | | |
| | | mineral : beryl<br>rock : very light yellowish green, slightly translucid<br>powder : white (green reflection)<br>origin : Lacorne district, Abitibi, Québec<br><br>production process: |
| light ivory | 509 | .30 g of beryl + 50 cc of transparent polyester resin + 1% of catalyst / manual grinding / moulding / hardening (white [light yellow reflection]) / irradiated with electrons at 155,082 rad (followed at «dark greenish yellow») |
| | 510 | mineral : fluorine<br>rock : light pink, translucid<br>powder : white (light pink reflection)<br>origin : Saint-Lawrence Fluorspar Company, Saint-Lawrence, Newfoundland<br><br>production process: |
| light ivory | 511 | 2 g of fluorine + 20 ml nitric acid / soaking: 3 d. / drying on hot plate (medium orange-pink): .2 g + 50 cc of transparent polyester resin + 1% of catalyst / manual grinding / moulding / hardening (grey [light yellow reflection]) / irradiated with electrons at 155,082 rad (followed at «brownish grey [accentuated yellow reflection]») |

| | | |
|---|---|---|
| light ivory | 512 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml nitric acid / soaking: 3 d. / drying on hot plate (very, very light orange): .2 g + 50 cc of transparent polyester resin + 1% of catalyst / manual grinding / moulding / hardening (very, very light grey [light yellow reflection]) / irradiated with electrons at 155,082 rad<br>(followed at «dark greenish yellow») |
| light ivory | 513 | mineral : orthoclase<br>rock : white (grey reflection)<br>powder : white (grey reflection)<br>origin : mine near Buckingham, Papineau county, Québec<br><br>production process:<br>2 g of orthoclase + 20 ml sulphuric acid / soaking: 3 d. / drying on hot plate (mixture of particles: white / brown): .3 g + 50 cc of transparent polyester resin + 1% of catalyst / manual grinding / moulding / hardening (very light grey [light yellow reflection]) / irradiated with electrons at 155,082 rad<br>(followed at «pale yellow») |
| ivory | 514 | mineral : apatite<br>rock : medium brownish red<br>powder : light pinkish beige<br>origin : Ile Calumet, Pontiac county, Québec<br><br>production process:<br>.20 g of apatite + 50 cc of transparent polyester resin + 1% of catalyst / manual grinding / moulding / hardening (very, very light greyish beige [weak yellow tone]) / irradiated with electrons at 155,082 rad<br>(followed at «greyish beige [yellow tone]») |
| ivory | 515 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>.20 g of fluorine + 50 cc of transparent polyester |

| | | |
|---|---|---|
| | | resin + 1% of catalyst / manual grinding / moulding / hardening (very, very light greenish yellow) / irradiated with electrons at 155,082 rad (followed at «lemon-yellow [light green reflection]») |
| ivory | 516 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>2 g of fluorine + 20 ml nitric acid / soaking: 3 d. / drying on hot plate (pink): .2 g + 50 cc of transparent polyester resin + 1% of catalyst / manual grinding / moulding / hardening (light grey [light yellowish green reflection]) / irradiated with electrons at 155,082 rad (followed at «greenish yellow more accentuated than the "light greenish yellow"») |
| ivory | 517 | mineral : steatite<br>rock : light cold grey, slightly translucid<br>powder : light grey<br>origin : East Broughton, Québec<br><br>production process:<br>0†1200 °F (grey more accentuated than the «light grey»): 2 g + 5 ml hydrochloric acid + 20 ml nitric acid / soaking: 3 d. / drying on hot plate (very, very light brown): .3 g + 50 cc of transparent polyester resin + 1% of catalyst / manual grinding / moulding / hardening (very, very light yellow) / irradiated with electrons at 155,082 rad (followed at «greenish yellow») |
| | | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 25 ml sulphuric acid / soaking: 24 h / drying on hot plate (light greyish green): 1 g + 1 cc of white transparent printing ink / manual grinding / 6 superimpositions on white frosted paper (ivory) / irradiated with gamma rays[**] at: |

| | | |
|---|---|---|
| ivory a little darker than «ivory» | 518 | 11.4 Mrad[89] |
| ↓ | | |
| ivory a little darker than «ivory» | 519 | 17.91 Mrad |
| ↓ | | |
| ivory a little darker than «ivory» | 520 | 22.8 Mrad |
| | 521 | mineral : apatite<br>rock : reddish brown<br>powder : light pinkish beige<br>origin : Calumet, Pontiac county, Québec<br><br>production process:<br>3 g of apatite + 20 ml sulphuric acid / soaking: 3 d. / drying on hot plate (light brown): 1 g + 1 cc of white transparent printing ink / manual grinding / 13 superimpositions on white frosted paper (ivory) / irradiated with gamma rays at: |
| ivory a little darker than «ivory» | 522 | 11.4 Mrad[89] |
| ↓ | | |
| ivory a little darker than «ivory» | 523 | 17.91 Mrad |
| ↓ | | |
| ivory a little darker than «ivory» | 524 | 22.8 Mrad |
| | | mineral : fluorine<br>rock : light pink, translucid<br>powder : white (light pink reflection)<br>origin : Saint-Lawrence Fluorspar Company, Saint-Lawrence, Newfoundland<br><br>production process: |
| accentuated ivory | 525 | 2 g of fluorine + 20 ml hydrochloric acid / soaking: 3 d. / drying on hot plate (orange): .2 g + 50 cc of transparent polyester resin + 1% of catalyst / manual grinding / moulding / hardening (pale grey [beige tone and light yellow reflection]) / irradiated with electrons at 155,082 rad (followed at «beige [yellow tone]») |
| ivory (green tone) | | |

74

| | | |
|---|---|---|
| | 526 | mineral : fuel oil soot[86]<br>powder : profound brownish black<br>origin : boiler room of Laval University, city of Québec, Québec |
| light ivory (light green tone) | 527 | <u>production process:</u><br>2 g of soot + 20 ml sulphuric acid / boiling reaction when the soot is deposited in acid / immediately after, separation of the resulting liquid and solid / soaking: 24 h / drying on hot plate (colour of the liquid: cold and mat grass-green [light grey tone]): .2 g + 50 cc of transparent polyester resin + 1% of catalyst / manual grinding / moulding / hardening (very, very light yellowish green) / irradiated with electrons at 355,082 rad (followed at «light and accentuated greenish yellow») |
| | | mineral : steatite<br>rock : light evergreen<br>powder : white<br>origin : East Broughton, Québec |
| ivory (very light green tone) | 528 | <u>production process:</u><br>2 g of steatite + 20 ml hydrochloric acid / soaking: 3 d. / drying on hot plate (light cream): .3 g + 50 cc of transparent polyester resin + 1% of catalyst / manual grinding / moulding / hardening (very, very light greenish yellow) / irradiated with gamma rays at 11.4 Mrad |
| ivory (yellow tone) | | |
| | | mineral : steatite<br>rock : light evergreen<br>powder : white<br>origin : East Broughton, Québec |
| ivory (very light yellow reflection) | 529 | <u>production process:</u><br>2 g of steatite + 20 ml nitric acid / soaking: 3 d. / natural drying (white [light yellow reflection]) / irradiated with gamma rays at 64.7 Mrad (followed at «medium yellowish beige [light greenish grey tone]») |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| | | production process:<br>3 g of asbestos + 1 cc of white transparent printing ink / mechanical grinding / 1 impression on white frosted paper (ivory [grey tone]) / irradiated with gamma rays at: |
| ivory (yellow tone) ↓ | 530 | 17.91 Mrad°° |
| ivory (yellow tone) | 531 | 22.8 Mrad |
| ivory (orange tone) | | |
| ivory (yellowish orange reflection) more accentuated than «ivory (light yellowish orange reflection)» | 532 | mineral : apatite<br>rock : pale brownish green<br>powder : very light greyish green<br>origin : Black Lake, Thetford county, Québec<br><br>production process:<br>2 g of apatite + 25 ml sulphuric acid / soaking: 24 h / drying on hot plate (white): .3 g + 50 cc of transparent polyester resin + 1% of catalyst / manual grinding / moulding / hardening (ivory [light orange reflection]) / irradiated with electrons at 155,082 rad (followed at «light beige») |
| ivory (beige tone) | | |
| light ivory (beige tone) | 533 | mineral : olivine<br>powder : colourless (green reflection)<br>origin : Mount Haven, United States<br><br>production process:<br>3 g of olivine + 20 ml hydrofluoric acid / soaking: 24 h / drying in a drying stove at 100 °F (light cream [light orange tone]): .3 g + 50 cc of transparent polyester resin + 1% of catalyst / manual grinding / moulding / hardening (very, very light beige) / irradiated with gamma rays at 11.4 Mrad |
| | 534 | mineral : apatite<br>rock : dark grass-green (yellow tone), very slightly translucid<br>powder : powder filtered at 14 meshes: very, very light green; powder filtered below 14 meshes: light grey (beige tone and green reflection) |

76

| | | |
|---|---|---|
| ivory (beige tone) darker than «light ivory (beige tone)» | 535 | origin : Ile Calumet, Pontiac county, Québec<br><br>production process:<br>3 g of apatite + 20 ml sulphuric acid / soaking: 3 d. / drying on hot plate (light beige): .3 g + 50 cc of transparent polyester resin + 1% of catalyst / manual grinding / moulding / hardening (light beige [light yellow reflection]) / irradiated with electrons at 155,082 rad (followed at «beige [yellow tone]») |
| ivory (beige tone) | 536 | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml sulphuric acid / soaking: 3 d. / drying on hot plate (very light brownish grey): .3 g + 50 cc of transparent polyester resin + 1% of catalyst / manual grinding / moulding / hardening (pale yellow) / irradiated with electrons at 155,082 rad (followed at «slightly more accentuated and darker yellow than the "pale yellow"») |
| cream | | |
| | 537 | mineral : silica[91]<br>powder : very light grey, crystalline<br>origin : mine exploited by the Développement Gex Inc. of Montréal for exploitation by SKW Bécancour. Lac La Galette, Charlevoix county, 30 miles at the North of Saint-Urbain, Québec<br><br>production process:<br>2 g of silica + 2 g of sodium carbonate: |
| very light cream, almost white | 538 | 0↑1300 °F + 1 h at 1300 °F |
| very light cream, almost white | 539 | 0↑1400 °F + 1 h at 1400 °F |
| very light cream, almost white | 540 | 0↑1500 °F + 15 min at 1500 °F |
| very light cream, | 541 | 0↑1500 °F + 30 min at 1500 °F |

| | | |
|---|---|---|
| almost white<br>↓<br>very light cream, almost white | 542 | 0↑1500 °F + 45 min. at 1500 °F<br>(followed at «light apple-green») |
| very light cream, almost white | 543 | mineral : sphalerite[31]<br>rock : honey-yellow<br>powder : pale honey-yellow<br>origin : Federal Mine, Lemieux district, Gaspésie, Québec<br><br>production process:<br>80 g of sphalerite + 100 ml nitric acid / soaking: 5 mo. / natural drying |
| whitened cream | 544 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 2 g of sodium carbonate:<br>0↑1500 °F + 1 h at 1500 °F |
| ↓<br>whitened cream | 545 | 0↑1600 °F + 1 h at 1600 °F<br>(followed at «pale apple-green») |
| | 546 | mineral : bauxite[92]<br>powder : pinkish beige, mat<br>origin : Alcan Company, French Guyana<br><br>production process:<br>3 g of bauxite + 25 ml hydrochloric acid / soaking: 5 d. / drying on hot plate (olive-green [yellow tone]): 1 g + 1 cc of white transparent printing ink / mechanical grinding / 1 impression on frosted white paper (very light cream [light orange tone]) / irradiated with gamma rays at: |
| cream a little lighter than «very light cream» | 547 | 5.7 Mrad |
| cream a little lighter than «very light cream» | 548 | 11.4 Mrad |
| cream a little lighter than «very light | 549 | 17.91 Mrad |

78

| | | |
|---|---|---|
| cream» ↓ cream a little lighter than «very light cream» | 550 | 22.8 Mrad |
| | | mineral : barite<br>rock : pinkish white<br><br>powder : white<br>origin : Niobec Mine, Saint-Honoré, Saguenay, Québec<br><br><u>production process:</u><br>(followed from «very light grey»)<br>2 g of barite + 2 g of sodium carbonate: |
| very light cream ↓ | 551 | 0↑1600 °F + 1 h at 1600 °F |
| very light cream | 552 | 0↑1700 °F + 1 h at 1700 °F<br>(followed at «mixture of particles: light green / light yellow») |
| | | mineral : calcite<br>rock : light pink<br>powder : pinkish white<br>origin : Huddersfield district, Pontiac county, Québec<br><br><u>production process:</u><br>2 g of calcite + 2 g of sodium carbonate: |
| very light cream \| | 553 | 0↑1500 °F + 1 h at 1500 °F |
| cream a little darker \| | 554 | 0↑1600 °F + 1 h at 1600 °F |
| cream still a little darker \| | 555 | 0↑1700 °F + 1 h at 1700 °F |
| cream still a little darker ↓ | 556 | 0↑1800 °F + 1 h at 1800 °F |
| cream a little darker | 557 | 0↑1900 °F + 1 h at 1900 °F |
| | | mineral : corundum<br>rock : medium grey<br>powder : light grey<br>origin : Transvaal, Africa<br><br><u>production process:</u> |
| very light cream | 558 | 1 g of corundum + 50 ml sulphuric acid / soaking: 2 wk. / drying on hot plate |

| | | |
|---|---|---|
| | | mineral : dolomite<br>rock : light grey<br>powder : light grey<br>origin : Shefferville, Ungava, Québec<br><br>mineral : calcite[11]<br>powder : white<br>origin : Calcite du Nord Company, Saint-Eugène de Mistassini, Lac Saint-Jean, Québec<br><br>production process:<br>1 g of dolomite + 1 g of calcite / 1000 °C / 1 h |
| very light cream | 559 | |
| | | mineral : fluorine<br>rock : white (pink reflection), translucid<br>powder : white (grey reflection)<br>origin : Saint-Lawrence Fluorspar Company, Saint-Lawrence, Newfoundland<br><br>mineral : calcite[11]<br>powder : white<br>origin : Calcite du Nord Company, Saint-Eugène de Mistassini, Lac Saint-Jean, Québec<br><br>production process:<br>1 g of fluorine + 1 g of calcite / 1000 °C / 1 h |
| very light cream | 560 | |
| very light cream | 561 | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) liquid (2nd) at the surface; b) the layer in between: a mixture of liquid and solid; c) the solid at the bottom of the solution / natural drying (colour of the 2nd liquid: light greyish beige) / irradiated with gamma rays at 64.7 Mrad<br>(followed at «pale milky chocolate-brown») |
| | 561.1 | mineral : tellurium<br>powder : dark metallic grey<br>origin : Minéraux Noranda Inc., Montréal, Québec, lot 64 |

| | | |
|---|---|---|
| very light and milky cream, mat and translucid | 561.2 | <u>production process:</u><br>150 g of molten glass (sodalime) is collected at the state of fusion in a furnace (1200 °C) on a metal rod / .45 g of tellurium is sprinkled at the surface of the glass / the entity is reintroduced in the furnace and melted with the flame at 1200 °C / then, the «collect» is detached from the metal rod |
| light and milky cream, mat and translucid | 561.3 | <u>production process:</u><br>150 g of molten glass (sodalime) is collected at the state of fusion in a furnace (1200 °C) on a metal rod / 1 g of tellurium is sprinkled at the surface of the glass / the entity is reintroduced in the furnace and melted with the flame at 1200 °C / then, the «collect» is detached from the metal rod |
| cream a little lighter than «light cream» | 562 | mineral : asbestos[4]<br>rock : dark grey (green reflection)<br>powder : dark grey (green reflection)<br>origin : Asbestos Corporation Ltd., Thetford Mines, Québec<br><br><u>production process:</u><br>3 g of asbestos + 20 ml hydrofluoric acid / soaking: 24 h / drying in a drying oven at 100 °F (light grey [beige tone]): .50 g + 1 cc of white transparent printing ink / manual grinding / 1 impression on frosted white paper (light cream) / irradiated with gamma rays at 11.4 Mrad[89,89a] |
| | 563 | mineral : serpentine<br>rock : yellowish green<br>powder : light greenish yellow<br>origin : probably Thetford Mines, Eastern Townships, Québec<br><br><u>production process:</u><br>(followed from «orange-cream [green reflection]») |
| cream a little lighter than «light cream» | 564 | 2 g of serpentine + 2 g of sodium carbonate (light or whitened greenish yellow) / irradiated with gamma rays at 424.7 Mrad |
| cream a little lighter than «light cream» | 565 | <u>production process:</u><br>2 g of serpentine + 2 g of sodium carbonate (light or whitened greenish yellow) / irradiated with electrons at 302,831 rad[36] |
| | | mineral : olivine<br>powder : colourless (green reflection)<br>origin : Mount Haven, United States |

81

| | | |
|---|---|---|
| cream a little lighter than «light cream» | 566 | production process:<br>3 g of olivine + 20 ml hydrofluoric acid / soaking: 24 h / drying in drying oven at 100 °F (light cream [light orange tone]) / irradiated with electrons at 302,831 rad[36] |
| light cream | 567 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>.50 g of asbestos + .50 g of titanium dioxide + + .50 g of sulphur / 1600 °F / 1 h (followed at «chamois») |
| light cream | 568 | mineral : dolomite<br>rock : white (yellow localized reflection), crystalline and translucid<br>powder : white<br>origin : Bristol district, Pontiac county, Québec<br><br>production process:<br>2 g of dolomite + 2 g of sodium carbonate / 1500 °F / 1 h (light grey) / irradiated with electrons at 162,431 rad (followed at «very light beige») |
| light cream | 569<br><br><br><br><br><br>570 | mineral : galena<br>rock : dark grey, with metallic brilliance<br>powder : dark grey, with metallic brilliance<br>origin : Trail, British Columbia<br><br>production process:<br>20 g of galena + 100 ml nitric acid / soaking: 5 mo. / natural drying[93] |
| | | mineral : microcline<br>rock : white (grey reflection)<br>powder : white (grey reflection)<br>origin : Buckingham, Québec |

| | | |
|---|---|---|
| light cream | 571 | <u>production process:</u><br>powder irradiated with gamma rays at 604.53 Mrad (followed at «light creamy yellow») |
| light cream | 572 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>5 g of molybdenite + 50 ml hydrochloric acid / soaking: 2 wk. / drying on hot plate |
| light cream | 573 | mineral : steatite<br>rock : light evergreen<br>powder : white<br>origin : East Broughton, Québec<br><br><u>production process:</u><br>2 g of steatite + 20 ml hydrochloric acid / soaking: 3 d. / drying on hot plate |
| cream a little darker than «light cream» | 574 | mineral : apatite<br>rock : pale brownish green<br>powder : very light greyish green<br>origin : Black Lake, Thetford county, Québec<br><br><u>production process:</u><br>2 g of apatite + 20 ml hydrofluoric acid / soaking: 24 h / drying in a drying oven at 100 °F (very light orange): .50 g + 1 cc of white transparent printing ink / manual grinding / 13 superimpositions on white frosted paper (light cream) / irradiated with gamma rays at 5.7 Mrad[93a] |
| cream a little darker than «light cream» | 575 | mineral : apatite<br>rock : reddish brown<br>powder : light pinkish beige<br>origin : Calumet, Pontiac county, Québec<br><br><u>production process:</u><br>3 g of apatite + 25 ml nitric acid / soaking: 3 d. / drying on hot plate (light beige): 1 g + 1 cc of white transparent printing ink / manual grinding / 5 superimpositions on white frosted paper (light cream [with yellow particles]) irradiated with gamma rays at 17.91 Mrad[90,93b] |

| | | |
|---|---|---|
| | 576 | mineral : beryl<br>rock : light blue, slightly translucid<br>powder : light grey<br>origin : Abitibi, Québec<br><br>production process:<br>2 g of beryl + 20 ml hydrofluoric acid / soaking: 24 h / drying in a drying oven at 100 °F (mixture of particles: light blue / light beige): .5 g + 1 cc of white transparent printing ink / manual grinding / 13 superimpositions on white frosted paper (light cream) / irradiated with gamma rays at: |
| cream a little darker than «light cream»<br>↓ | 577 | 17.91 Mrad[90] |
| cream still a little darker | 578 | 22.8 Mrad |
| | | mineral : calcite<br>rock : light pink<br>powder : pinkish white<br>origin : Huddersfield district, Pontiac county, Québec<br><br>production process: |
| cream a little darker than «light cream» | 579 | 2 g of calcite + 2 g of sodium carbonate / 0↑1600 °F + 1 h at 1600 °F (cream a little darker than «very light cream») / irradiated with electrons at 162,431 rad<br>(followed at «beige [brownish tone]») |
| | | mineral : olivine<br>powder : colourless (green reflection)<br>origin : Mount Haven, United States<br><br>production process: |
| cream a little darker and accentuated than «light cream» | 580 | 30 g of olivine + 100 ml sulphuric acid / soaking: 24 h / drying on hot plate (light cream [light orange tone]) / irradiated with gamma rays at 63.88 Mrad<br>(followed at «medium beige [orange tone]») |
| | 581 | mineral : quartz - mica[96]<br>powder : light cream (light yellow tone)<br>origin : small copper and nickel deposit, in the South-Western area of a mass of serpentinite, at 3 km at the West of Saint-Fabien-de-Panet, Québec |

84

| | | |
|---|---|---|
| cream a little darker than «light cream» | 582 | <u>production process:</u><br>0↑500 °F<br><br>(followed at «medium salmon») |
| | 583 | mineral : anorthosite<br>rock : light grey<br>powder : very, very light greyish beige<br>origin : rang Sainte-Germaine, Oka, Québec |
| cream | 583.1 | <u>production process:</u><br>2 g of anorthosite + 20 ml ammonia / natural drying |
| cream | 584 | mineral : barite<br>rock : pinkish white<br><br>powder : white<br>origin : Niobec Mine, Saint-Honoré, Saguenay, Québec<br><br><u>production process:</u><br>1700 °F / 1 h |
| cream | 585 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>(followed from «pinkish beige»)<br>0↑1500 °F (light beige [orange tone]) / rock irradiated with gamma rays at 424.7 Mrad |
| cream<br>↓ | 586 | mineral : calcite[11]<br>powder : white<br>origin : Calcite du Nord Company, Saint-Eugène de Mistassini, Lac Saint-Jean, Québec<br><br><u>production process:</u><br>1 g of calcite + 1 cc of synthetic white enamel paint[94] for the automobile / manual grinding / application on a piece of body sheet steel measuring 1" x 1" / irradiated with gamma rays at:<br>57.4 Mrad<br><br>(followed at «orange rust»)<br><br>(followed from «orange rust») |

85

| | | |
|---|---|---|
| crème | 587 | 247.6 Mrad<br>(followed at «orange rust») |
| cream | 588 | mineral : galena<br>rock : dark grey, with metallic brilliance<br>powder : dark grey, with metallic brilliance<br>origin : Trail, British Columbia<br><br>production process:<br>2 g of galena + 2 g of sodium carbonate / 1300 °F / 1 h (medium beige [light green tone]) irradiated with electrons at 162,431 rad[95] (followed at «dark beige [green reflection]») |
| cream | 589 | mineral : quartz - mica[96]<br>powder : light cream (light yellow tone)<br>origin : small copper and nickel deposit, in the South-Western area of a mass of serpentinite, at 3 km at the West of Saint-Fabien-de-Panet, Québec<br><br>production process:<br>powder irradiated with electrons at 302,831 rad[36,97] |
| cream | 590 | production process:<br>3 g of quartz - mica + 20 ml hydrochloric acid / soaking: 3 d. / drying on hot plate |
| cream | 591 | mineral : sodium carbonate<br>powder : white<br><br>production process:<br>1500 °F / 1 h |
| cream a little more accentuated than «cream» | 592 | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 20 ml sulphuric acid / soaking: 24 h / drying on hot plate (grey [light brown tone]): .5 g + 1 cc of white transparent printing ink / manual grinding / 1 impression (light cream) / irradiated with gamma rays at 11.4 Mrad[89,89a] |

86

| | | |
|---|---|---|
| cream a little more accentuated than «cream» | 593 | mineral : calcite<br>rock : light pink<br>powder : pinkish white<br>origin : Huddersfield district, Pontiac county, Québec<br><br>production process:<br>2 g of calcite + 2 g of sodium carbonate / 0↑1600 °F + 1 h at 1600 °F (cream a little darker than «very light cream») / irradiated with gamma rays at 64.7 Mrad<br>(followed at «light beige») |
| cream very slightly darker than «cream» | 594 | mineral : serpentine<br>rock : yellowish green<br>powder : light greenish yellow<br>origin : probably Thetford Mines, Eastern Townships, Québec<br><br>production process:<br>3 g of serpentine + 25 ml nitric acid / soaking: 24 h / drying on hot plate (light beige): 1 g + 1 cc of white transparent printing ink / mechanical grinding / 10 superimpositions on white frosted paper (cream) / irradiated with gamma rays at:<br>11.4 Mrad[89] |
| ↓ cream still a little darker | 595 | 17.91 Mrad |
| ↓ cream still a little darker | 595.1 | 22.8 Mrad |
| cream a little darker than «cream» | 596 | mineral : fluorine<br>rock : white (pinkish reflection), translucid<br>powder : white (grey reflection)<br>origin : Saint-Lawrence Fluorspar Company, Saint-Lawrence, Newfoundland<br><br>production process:<br>2 g of fluorine + 20 ml phosphoric acid / soaking: 3 d. / drying on hot plate [still humid] (white [light yellow reflection]): .5 g + 1 cc of white transparent printing ink / mechanical grinding / 12 superimpositions on white frosted paper (very light cream) / irradiated with gamma rays at 11.4 Mrad[89,89a] |
| | | mineral : hornblende<br>rock : medium evergreen (light grey tone), |

87

| | | |
|---|---|---|
| cream a little darker than «cream» | 597 | with a vitreous brilliance<br>powder : medium cold grey (light green tone)<br>origin : Abitibi, Québec<br><br>production process:<br>3 g of hornblende + 25 ml nitric acid / soaking: 24 h / drying on hot plate (medium greyish evergreen [light yellow tone]): 1 g + 1 cc of white transparent printing ink / manual grinding / 6 superimpositions on white frosted paper (cream) / irradiated with gamma rays at 5.7 Mrad[93a] |
| cream a little darker than «cream»<br>↓<br>cream still a little darker | 598<br><br><br>599 | mineral : apatite<br>rock : reddish brown<br>powder : light pinkish beige<br>origin : Calumet, Pontiac county, Québec<br><br>production process:<br>3 g of apatite + 20 ml phosphoric acid / soaking: 3 d. / drying on hot plate [still humid] (very light beige): .5 g + 1 cc of white transparent printing ink / mechanical grinding / 12 superimpositions on white frosted paper (very, very light cream) / irradiated with gamma rays at:<br>5.7 Mrad<br><br><br>17.91 Mrad |
| cream darker than «cream» | 600 | mineral : barite<br>rock : pinkish white<br><br>powder : white<br>origin : Niobec Mine, Saint-Honoré, Saguenay, Québec<br><br>production process:<br>1700 °F / 1 h (cream) / rock irradiated with electrons at 162,431 rad<br>(followed at «medium pinkish beige») |
| dark cream | 601 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>6 g of molybdenite + 50 ml nitric acid / soaking: |

| | | |
|---|---|---|
| | | 2 wk. / drying on hot plate |
| dark cream | 602 | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) the liquid (2nd) at the surface; b) the layer in between: a mixture of the liquid and the solid; c) the solid at the bottom of the solution / natural drying (colour of the 2nd liquid: light greyish beige) / irradiated with electrons at 162,431 rad |
| mixture of particles | | |
| | 603 | mineral : goethite[106]<br>powder : orange rust<br>origin : Red Mill, in the suburbs of Cap-de-la-Madeleine, Québec |
| cream / orange | 604 | production process:<br>0↑1400 °F / slow cooling in furnace (indian red[107]): 3 g + 20 ml hydrofluoric acid / soaking: 24 h / drying in drying oven at 100 °F |
| 2 zones: cream / brown | 605 | mineral : siderite<br>rock : caramel-brown (grey tone)<br>powder : light beige (orange tone)<br>origin : De-Mix quarry, North side of Mont Saint-Hilaire, Rouville county, Québec<br><br>production process:<br>(followed at «beige [orange tone]»)<br>1 g of siderite + 1 cc of white opaque synthetic enamel paint for the car / manual grinding / application on a piece of metal sheet for the body measuring 1" x 1" (dark creamy beige) / irradiated with gamma rays at 360 Mrad |
| cream (yellow tone) | | |
| | | mineral : microcline<br>rock : white (grey reflection)<br>powder : white (grey reflection)<br>origin : Buckingham, Québec |

| | | |
|---|---|---|
| very light cream (yellow tone) | 606 | production process:<br>4 g of microcline + 80 ml nitric acid / soaking: 2 wk. / drying on hot plate |
| | 607 | mineral : ochre[98]<br>powder : yellow<br>origin : small copper and nickel deposit, in the South-Western area of a mass of serpentinite, at 3 km at the West of Saint-Fabien-de-Panet, Québec |
| very light cream (yellow tone) | 608 | production process:<br>4 g of ochre + 80 ml nitric acid / soaking: 2 wk. / drying on hot plate |
| cream (accentuated yellow tone) a little darker than «very light cream (yellow tone)» | 609 | mineral : apatite<br>rock : medium brownish red<br>powder : light pinkish beige<br>origin : Ile Calumet, Pontiac county, Québec<br><br>production process:<br>3 g of apatite + 25 ml sulphuric acid / soaking: 3 d. / drying on hot plate (greyish beige): 1 g + 1 cc of white transparent printing ink / manual grinding / 6 superimpositions on white frosted paper (very light cream) / irradiated with gamma rays at 17.91 Mrad[90,97b] |
| light cream (yellow tone) | 610 | mineral : beryl<br>rock : very light yellowish green, slightly translucid<br>powder : white (green reflection)<br>origin : Lacorne district, Abitibi, Québec<br><br>production process:<br>2 g of beryl + 20 ml hydrochloric acid / soaking: 3 d. / drying on hot plate |
| light cream (yellow tone) | 611 | production process:<br>2 g of beryl + 20 ml nitric acid / soaking: 3 d. / drying on hot plate |
| | | mineral : ochre[98]<br>powder : yellow<br>origin : small copper and nickel deposit, in the South-Western area of a mass of serpentinite at 3 km at the West of Saint-Fabien-de-Panet, Québec |

| | | |
|---|---|---|
| light cream (yellow tone) | 612 | <u>production process:</u><br>10 g of ochre + 100 ml hydrochloric acid / soaking: 1 wk. / drying on hot plate (medium yellowish cream [light orange tone]) / irradiated with electrons at 302,831 rad[36] |
| light cream (yellow tone) | 613 | mineral : dolomite<br>rock : white (localized yellow reflection), crystalline et translucid<br>powder : white<br>origin : Bristol district, Pontiac county, Québec<br><br><u>production process:</u><br>1000 °C / 1 h |
| cream (accentuatated yellow tone) | 614 | <u>production process:</u><br>1000 °C / 1 h (light cream [yellow tone]) / powder irradiated with gamma rays at 63.484 Mrad (followed at «very, very light beige») |
| cream (yellow tone) very slightly darker than «cream (yellow tone)» | 615 | mineral : hornblende<br>rock : medium evergreen (light grey tone), with vitreous brilliance<br>powder : medium cold grey (light green tone)<br>origin : Abitibi, Québec<br><br><u>production process:</u><br>3 g of hornblende + 20 ml hydrofluoric acid / soaking: 24 h / drying in drying oven at 100 °F (white): 1 g + 1 cc of white transparent printing ink / manual grinding / 7 superimpositions on white frosted paper (yellowish cream) / irradiated with gamma rays at 17.91 Mrad[90,93b] |
| medium cream (yellow tone) | 616 | mineral : microcline<br>rock : white (grey reflection)<br>powder : white (grey reflection)<br>origin : Buckingham, Québec<br><br><u>production process:</u><br>4 g of microcline + 80 ml nitric acid / soaking: 2 wk. / drying on hot plate (very light cream [yellow tone]) / irradiated with gamma rays at 424.7 Mrad[81,99] |
| mixture of particles | | |
| | | mineral : uraninite<br>rock : medium chocolate-brown (red Bordeau tone) |

91

| | | |
|---|---|---|
| dark yellowish cream / dark beige (brown tone) | 617 | powder : medium milky chocolate-brown<br>origin : Yellowknife, Canada<br><br><u>production process:</u><br>0↑1900 °F (medium brown [orange tone]): 1 g + 50 ml hydrochloric acid / soaking: 2 wk. / drying on hot plate (light apple-green) / irradiated with gamma rays at 423.88 Mrad[262] |
| yellowish cream (green tone) | | |
| very light yellowish cream (very light green tone)<br>↓ | 618 | mineral : microcline<br>rock : white (grey reflection)<br>powder : white (grey reflection)<br>origin : Buckingham, Québec<br><br><u>production process:</u><br>4 g of microcline + 80 ml nitric acid / soaking: 2 wk. / drying on hot plate (very light cream [yellow tone]) / irradiated with electrons:<br>162,431 rad |
| very light yellowish cream (very light green tone) | 619 | 302,831 rad[45] |
| light yellowish cream (light green tone) | 620 | mineral : armenite<br>rock : light grey<br>powder : very light grey<br>origin : Abitibi, Québec<br><br><u>production process:</u><br>4 g of armenite + 100 ml hydrochloric acid / soaking: 4 years / drying on hot plate[100] |
| | 621 | mineral : cement[82]<br>powder : medium cold grey<br>origin : Union des Carrières, Limoilou, Québec |
| yellowish cream (light green tone) | 622 | <u>production process:</u><br>4 g of cement + 20 ml nitric acid / soaking: 24 h / drying on hot plate |
| yellowish cream (orange tone) | | |
| | | mineral : zincite<br>rock : mixture of areas: dark grey / orange-red<br>powder : medium milky chocolate-brown (red |

92

| | | |
|---|---|---|
| | | tone)<br>origin : Franklin, New Jersey, United-States |
| light yellowish cream (very light orange tone) | 623 | production process:<br>4 g of zincite + 50 ml sulphuric acid / soaking: 2 wk. / drying on hot plate (creamy white [light orange reflection]) / irradiated with gamma rays at 64.7 Mrad<br>(followed at «light brownish beige [orange-pink tone]») |
| | 624 | mineral : pyrolusite[101]<br>rock : black (light brown tone), mat<br>powder : black (light brown tone), mat<br>origin : probably Nova Scotia<br><br>production process:<br>110 g of pyrolusite + 150 ml phosphoric acid / soaking: 2 wk. / separation of the liquid and the solid / drying on hot plate [still humid] / (colour of the 1st liquid: crimson-violet) / attempt to dry the 1st liquid «crimson-violet» on hot plate / reduction of the liquid / then, resting during 7 mo. / new attempt to dry it on a sand bath [still humid] / the liquid is reduced to the state of a paste [still humid] (colour of the paste obtained from the 1st liquid: pinkish beige): 1 g + 1 cc of white transparent printing ink / manual grinding / 11 superimpositions on white frosted paper (light yellowish cream) / irradiated with gamma rays at: |
| yellowish cream (orange tone) darker than «light yellowish cream (orange tone)»<br>↓ | 625 | 5.7 Mrad |
| yellowish cream (orange tone a bit more accentuated) | 626 | 11.4 Mrad[89a] |
| | | mineral : ochre[78]<br>powder : yellow<br>origin : small copper and nickel deposit, in the South-Western area of a mass of serpentinite at 3 km at the West of Saint-Fabien-de-Panet, Québec |
| medium yellowish cream (light orange tone) | 627 | production process:<br>10 g of ochre + 100 ml hydrochloric acid / soaking: 1 wk. / drying on hot plate |

| | | |
|---|---|---|
| yellowish cream (grey tone) | | |
| | 628 | mineral : pentlandite[102]<br>rock : dark iron-grey, with silver and yellow golden metallic brilliance<br>powder : dark iron-grey (accentuated brown tone)<br>origin : Inco Co., Sudbury, Ontario |
| light yellowish cream (light grey tone) | 629 | production process:<br>0↑1900 °F (dark iron-grey): .50 g + 50 ml sulphuric acid / soaking: 2 wk. / drying on hot plate |
| cream (orange tone) | | |
| | 630 | mineral : haematite<br>rock : medium chocolate-brown<br>powder : medium chocolate-brown<br>origin : Nouveau-Québec, Québec |
| very, very light cream, almost white (light orange tone) | 631 | production process:<br>4 g of haematite + 100 ml sulphuric acid / soaking: 2 wk. / drying on hot plate |
| very, very light cream (orange tone much more accentuated) | 632 | production process:<br>4 g of haematite + 100 ml sulphuric acid / soaking: 2 wk. / drying on hot plate (very, very light cream, almost white [light orange tone]) / irradiated with gamma rays at 64.7 Mrad (followed at «medium cold beige») |
| | | mineral : barite<br>rock : pinkish white<br>powder : white<br>origin : Niobec Mine, Saint-Honoré, Saguenay, Québec |
| cream (very, very light orange tone) more pale than «very light cream (light orange tone)» | 633 | production process:<br>4 g of barite + 50 ml hydrochloric acid / soaking: 2 wk. / drying on hot plate (very light cream [light orange tone]) / irradiated with electrons at 302,831 rad[36] |
| very light cream (light orange tone) | 634 | production process:<br>4 g of barite + 50 ml hydrochloric acid / soaking: 2 wk. / drying on hot plate |

| | | |
|---|---|---|
| | 635 | mineral : amazonite<br>rock : light greenish turquoise<br>powder : white (turquoise reflection)<br>origin : Lac Sairs, Témiscamingue, Québec<br><br>production process:<br>(followed from «pale brown») |
| light cream (very light orange tone) | 636 | 2 g of amazonite + 2 g of sodium carbonate / / 0↑1600 °F + 1 h at 1600 °F<br>(followed at «brown») |
| | | mineral : fluorescent calcite<br>rock : white (grey or brown localized reflection), translucid<br>powder : white (yellow reflection)<br>origin : Bancroft, Ontario<br><br>production process: |
| light cream (light orange tone) | 637 | 2 g of calcite + 2.50 g of sodium carbonate / 1700 °F / 1 h (emerald-green) / irradiated with electrons at 162,431 rad<br>(followed at «brownish beige») |
| | | mineral : olivine<br>powder : colourless (green reflection)<br>origin : Mount Haven, United States<br><br>production process: |
| light cream (light orange tone) | 638 | 3 g of olivine + 20 ml hydrofluoric acid / soaking: 24 h / drying in a drying oven at 100 °F |
| | | production process: |
| light cream (light orange tone) | 639 | 30 g of olivine + 100 ml sulphuric acid / soaking: 24 h / drying on hot plate |
| | | mineral : antigorite<br>rock : pale yellowish green<br>powder : very pale greenish yellow<br>origin : Canadian Refractories Mine, Kilmar, Québec<br><br>production process: |
| light cream (light orange tone) | 640 | 2 g of antigorite + 2 g of sodium carbonate / 0↑1700 °F + 1 h at 1700 °F (light mint-green) / irradiated with electrons at 162,431 rad<br>(followed at «pinkish beige») |
| | | mineral : wilsonite, local variety of scapolite or wernerite |

95

| | | |
|---|---|---|
| | | rock : grey (violet tone)<br>powder : light grey (lilac tone)<br>origin : Tetreault Mine, Montauban, Portneuf county, Québec<br><br>production process: |
| light cream (light orange tone) | 641 | 0↑1900 °F (light grey [beige tone]): .50 g + 50 ml hydrochloric acid / soaking: 2 wk. / drying on hot plate |
| | | production process:<br>0↑1900 °F (light grey [beige tone]): .50 g + 50 ml hydrochloric acid / soaking: 2 wk. / drying on hot plate (light cream [light orange tone]) / irradiated with gamma rays at: |
| cream (light orange tone) more accentuated than «light cream (light orange tone)»<br>↓ | 642 | 64.7 Mrad |
| cream (light orange tone) a little darker [brownish] | 643 | 424.7 Mrad |
| | | mineral : barite<br>rock : pinkish white<br><br>powder : white<br>origin : Niobec Mine, Saint-Honoré, Saguenay, Québec<br><br>production process: |
| cream (light orange tone) | 644 | 1700 °F / 1 h (cream): .30 g + 50 ml hydrochloric acid / soaking: 2 wk. / drying on hot plate |
| | 645 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «creamy yellow [light green tone]») |
| cream (light orange tone) | 646 | 2 g of molybdenite + 2 g of sodium carbonate / 0↑1200 °F + 1 h at 1200 °F<br>(followed at «brownish beige [green tone]») |
| | | mineral : asbestos[4]<br>rock : dark grey (green reflection)<br>powder : light grey (green reflection)<br>origin : Asbestos Corporation Ltd., Thetford |

| | | |
|---|---|---|
| | | Mines, Québec |
| cream (orange tone) | 647 | production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) + 40 ml nitric acid / soaking: 5 d. / separation of the liquid and the solid (colour of the liquid: light orange) / drying on sand bath / the liquid is irradiated with gamma rays at 64.7 Mrad<br>(followed at «medium chocolate-brown») |
| cream (orange tone and green reflection) | | |
| | | mineral : serpentine<br>rock : yellowish green<br>powder : light greenish yellow<br>origin : probably Thetford Mines, Eastern Townships, Québec |
| cream (orange tone and green reflection) a bit darker than «light cream (orange tone and green reflection)» | 648 | production process:<br>2 g of serpentine + 2 g of sodium carbonate (light or whitened greenish yellow) / irradiated with gamma rays at 64.7 Mrad<br>(followed at «cream a little lighter than "light cream"») |
| | 649 | mineral : bornite<br>rock : reddish brown (with localized green and bluish green oxidation)<br>powder : reddish brown<br>origin : Lac Musset, Fosse du Labrador, Québec |
| cream (orange and green tones) | 650 | production process:<br>(followed from «orange»)<br>2 g of bornite + 20 ml hydrochloric + 5 ml nitric acids / soaking: 6 d. / separation of the liquid and the solid / natural drying (colour of the solid: very light yellowish green) / irradiated with electrons at 305,200 rad[73] |
| cream (green tone) | | |
| | | mineral : armenite<br>rock : light grey<br>powder : very light grey<br>origin : Abitibi, Québec |

97

| | | |
|---|---|---|
| light cream green tone) | 651 | production process:<br>1 g of armenite + 50 ml nitric acid / soaking: 2 wk. / drying on hot plate |
| light cream (more accentuated green tone) | 652 | production process:<br>1 g of armenite + 50 ml nitric acid / soaking: 2 wk. / drying on hot plate (light cream [green tone]) / irradiated with gamma rays at 64.7 Mrad (followed at «intense yellow [very light green tone]») |
| light cream (light green tone) | 653 | mineral : antigorite<br>rock : pale yellowish green<br>powder : very pale greenish yellow<br>origin : Canadian Refractories Mine, Kilmar, Québec<br><br>production process:<br>2 g of antigorite + 2 g of sodium carbonate / 0↑1700 °F + 1 h à 1700 °F (light mint-green) / irradiated with gamma rays at 63.88 Mrad (followed at «mixture of particles: light beige / light grey / white») |
| cream (very light green tone) | 654 | mineral : amazonite<br>rock : greenish turquoise<br>powder : white (turquoise reflection)<br>origin : Lac Saint-Jean, Québec<br><br>production process:<br>2 g of amazonite + 20 ml sulphuric acid / soaking: 3 d. / drying on hot plate |
| mixture of particles | | |
| cream (green tone) / brown | 655 | mineral : spodumene<br>rock : pale green<br>powder : light grey, almost white<br>origin : Québec Lithium Co., Baraute, Abitibi, Québec<br><br>production process:<br>0↑1900 °F (medium brownish grey): .20 g + 50 ml nitric acid / soaking: 2 wk. / drying on hot plate |
| cream (green and grey tones) | | |
| | | mineral : molybdenite[103]<br>rock : medium grey, with metallic brilliance<br>powder : medium grey, with metallic brilliance |

| | | |
|---|---|---|
| | | origin : Anglo American Molybdenite Mine, near Lamotte, Preissiac district, Abitibi, Québec |
| | 656 | mineral : cement[1138]<br>powder : white |
| cream (green and grey tones) | 657 | <u>production process:</u><br>molybdenite crushed and heated 0↑1000 °F (Naples yellow): .50 g + 15 ml sulphuric acid / soaking: 2 d. / slow drying on hot plate (very intense greenish blue): .15 g + 6 cc of polymer for concrete[104] + 0.18 cc of catalyst + 1.5 thousandth of a g of cobalt 6% + 2 g of white cement[1138] / manual grinding / moulding / hardening (light greenish turquoise) / irradiated with gamma rays at 18.85 Mrad |
| dark cream (green and grey tones) | 658 | <u>production process:</u><br>molybdenite crushed and heated 0↑1400 °F (light metallic grey): 4 g + 20 ml phosphoric acid / soaking: 3 d. / drying on hot plate |
| cream (beige tone) | | |
| light cream (beige tone) | 659 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>1 g of calcite + 1 cc of white transparent synthetic enamel paint for the car[105] / manual grinding / application on a piece of metal sheet for the body measuring 1" x 1" (light yellowish cream) / irradiated with gamma rays at 3.77 Mrad<br>(followed at «grey [cream tone]») |
| light cream (beige tone) | 660 | mineral : olivine<br>rock : light grey, crystalline<br>powder : very light grey<br>origin : Mont Albert, Gaspésie, Québec<br><br><u>production process:</u><br>4 g of olivine + 50 ml sulphuric acid / soaking: 2 wk. / drying on hot plate (white [very light beige reflection]) / irradiated with gamma rays at 64.7 Mrad<br>(followed at «dark beige [orange tone]») |

99

| | | |
|---|---|---|
| light cream (beige tone) | 661 | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / natural drying / colour of the 1st liquid (followed at «light yellow [very light green tone]») |
| cream (beige tone) | 662 | mineral : barite<br>rock : pinkish white<br><br>powder : white<br>origin : Niobec Mine, Saint-Honoré, Saguenay, Québec<br><br>production process:<br>2 g of barite + 2 g of sodium carbonate / 0↑1700 °F + 1 h at 1700 °F (very light cream) / irradiated with gamma rays at 64.7 Mrad (followed at «light beige») |
| cream (beige tone) | 663 | mineral : beryl<br>rock : very light yellowish green, slightly translucid<br>powder : white (green reflection)<br>origin : Lacorne district, Abitibi, Québec<br><br>production process:<br>2 g of beryl + 20 ml sulphuric acid / soaking: 3 d. / drying on hot plate |
| cream (beige and green tones) | | |
| cream (beige and green tones) | 664 | mineral : beryl<br>rock : light blue (near turquoise, slightly turquoise), slightly translucid<br>powder : light grey<br>origin : Lacorne district, Abitibi, Québec<br><br>production process:<br>1 g of beryl + 1 cc of white transparent synthetic enamel paint for the car[94] / manual grinding / ap- plication on a piece of sheet steel for the body measuring 1" x 1" (cream [beige tone]) / irradia- ted with gamma rays at 5 Mrad (followed at «medium khaki-green») |
| cream (brown tone) | | |

100

| | | |
|---|---|---|
| | | mineral : quartz - mica[96]<br>powder : light cream (light yellow tone)<br>origin : small copper and nickel deposit in the South-Western area of a mass of serpentinite at 3 km at the West of Saint-Fabien-de-Panet, Québec<br><br><u>production process:</u><br>powder irradiated with gamma rays at: |
| cream (brown tone) a little darker than «light cream (brown tone)» | 665 | 5 Mrad |
| ↓ darkens and | 666 | 5.7 Mrad |
| | 667 | 10 Mrad |
| | 668 | 57.4 Mrad |
| | 669 | 64.7 Mrad |
| | 670 | 102.4 Mrad |
| | 671 | 148.4 Mrad |
| | 672 | 201.6 Mrad |
| | 673 | 247.6 Mrad |
| becomes more brown | 674 | 287.3 Mrad<br>(followed at «pale brown») |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u> |
| cream (brown tone) darker than «dark cream (brown tone)» | 675 | 6 g of molybdenite + 50 ml nitric acid / soaking: 2 wk. / drying on hot plate (dark cream) / irradiated with gamma rays at 64.7 Mrad (followed at «dark brownish beige [grey tone]») |
| cream (grey tone) | | |
| | | mineral : solid epidote<br>rock : brownish green<br>powder : brownish green<br>origin : James Bay, Québec<br><br><u>production process:</u> |
| very, very light cream (grey tone) | 676 | 0†1200 °F (medium beige [light orange tone]): 1 g + 40 ml sulphuric acid / soaking: 14 d. / drying on hot plate |
| | | mineral : diopside<br>rock : light grey |

| | | |
|---|---|---|
| very light greyish cream | 677 | powder : light beige<br>origin : Mont Orford, Québec<br><br><u>production process:</u><br>1 g of diopside + 50 ml sulphuric acid / soaking: 2 wk. / drying on hot plate (white [light beige reflection]) / irradiated with electrons at 302,831 rad[36] |
| vrey light greyish cream | 678 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>0↑1900 °F (light grey [beige tone]): .50 g + 50 ml nitric acid / soaking: 2 wk. / drying on hot plate |
| light greyish cream | 679 | mineral : fluorine<br>rock : violet and white, translucid<br>powder : very light grey<br>origin : Saint-Lawrence Fluorspar Company, Saint-Lawrence, Newfoundland<br><br><u>production process:</u><br>(followed from «light grey»)<br>1 g of fluorine + 1 cc of white transparent synthetic enamel paint for the car[94] / manual grinding / application on a piece of steel sheet for the body measuring 1" x 1" (light grey) / irradiated with gamma rays at 10 Mrad[351,352]<br>(followed at «light beige») |
| greyish cream (with blue particles) | 680 | mineral : halite[41]<br>rock : colourless<br>powder : colourless<br>origin : Seleine Mine, Iles-de-la-Madeleine, Québec<br><br><u>production process:</u><br>(followed from «medium brown [orange tone]»)<br>2 g of halite + 2 g of sodium carbonate:<br>0↑1400 °F + 1 h at 1400 °F |
| ↓<br>greyish cream (with blue particles) | 681 | 0↑1500 °F + 1 h at 1500 °F<br><br>(followed at «greyish cream [light yellow tone]») |

| | | |
|---|---|---|
| greyish cream (mat, translucid and milky) | 681.1 | mineral : tellurium<br>powder : dark metallic grey<br>origin : Minéraux Noranda Inc., lot 64, Montréal, Québec<br><br><u>production process:</u><br>the round part of a pyrex test tube is brought to the melting point with an oxyacetylene welding torch / then, 5 g of tellurium is sprinkled on the partially melted surface / the entity is immediately brought back to fusion with the torch / the cooling in ambient air is immediat[280] |
| greyish cream | 682 | mineral : dolomite<br>rock : white (localized yellow reflection), crystalline and translucid<br>powder : white<br>origin : Bristol district, Pontiac county, Québec<br><br><u>production process:</u><br>2 g of dolomite + 25 ml nitric acid / soaking: 3 d. / drying on hot plate |
| dark greyish cream | 683 | <u>production process:</u><br>(followed from «greyish cream [light green reflection]»)<br>2 g of dolomite + 25 ml nitric acid / soaking: 3 d. / drying on hot plate (greyish cream) / irradiated with gamma rays at 424.7 Mrad |
| mixture of particles | | |
| mostly cream (greyish tone) / medium grey / medium brownish beige / white | 684 | mineral : amazonite<br>rock : light greenish turquoise<br>powder : white (turquoise reflection)<br>origin : Lac Sairs, Témiscamingue, Québec<br><br><u>production process:</u><br>(followed from «beige»)<br>2 g of amazonite + 2 g of sodium carbonate / 0†1600 °F + 1 h at 1600 °F (light cream [very light orange tone]) / irradiated with gamma rays at 424.7 Mrad |
| greyish cream (green tone) | | |
| | | mineral : beryl<br>rock : very light yellowish green, slightly translucid<br>powder : white (green reflection)<br>origin : Lacorne district, Abitibi, Québec |

| | | |
|---|---|---|
| light greyish cream (very, very light green reflection) | 685 | production process:<br>(followed from «very light grey»)<br>1000 °C / 1 h (white [very light pinkish beige reflection]) / powder irradiated with gamma rays at 482.984 Mrad |
| greyish cream (light green reflection) much more intense and dark than «greyish cream (green reflection)» | 686 | mineral : dolomite<br>rock : white (localized yellow reflection), crystalline and translucid<br>powder : white<br>origin : Bristol district, Pontiac county, Québec<br><br>production process:<br>2 g of dolomite + 25 ml nitric acid / soaking: 3 d. / drying on hot plate (greyish cream) / irradiated with gamma rays at 64.7 Mrad<br><br>(followed at «dark greyish cream») |
| greyish cream (yellow tone) | | |
| greyish cream (yellow tone) a little darker than «very light greyish cream (yellow tone)» | 687 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>0↑1900 °F (light grey [beige tone]): .50 g + 50 ml nitric acid / soaking: 2 wk. / drying on hot plate (very light greyish cream) / irradiated with gamma rays at 64.7 Mrad<br><br>(followed at «medium and quite vivid yellow [orange tone]») |
| greyish cream (light yellow tone) | | 688 | mineral : halite[41]<br>rock : colourless<br>powder : colourless<br>origin : Seleine Mine, Iles-de-la-Madeleine, Québec<br><br>production process:<br>(followed from «greyish cream [with blue particles]»)<br>2 g of halite + 2 g of sodium carbonate:<br>0↑1600 °F + 1 h at 1600 °F |

| | | |
|---|---|---|
| greyish cream (yellow tone a little more accentuated) | 689 | 0↑1700 °F + 1 h at 1700 °F |
| ↓ | | |
| greyish cream (yellow tone a little more accentuated) | 690 | 0↑1800 °F + 1 h at 1800 °F |
| ↓ | | |
| greyish cream (yellow tone still a little more accentuated) | 691 | 0↑1900 °F + 1 h at 1900 °F |
| greyish cream (brown tone) | | |
| | 692 | mineral : crocidolite<br>rock : dark greyish blue<br>powder : pale greyish blue<br>origin : Griqualand district, South Africa |
| greyish cream (light brown tone) | 693 | production process:<br>4 g of crocidolite + 100 ml hydrochloric acid / / soaking: 2 d. / drying on hot plate (green [olive-green type]): .50 g + 1 cc of white transparent printing ink / mechanical grinding / 1 impression on white frosted paper (light greyish cream) / irradiated with gamma rays at 17.91 Mrad[88,89,93b] |

LILAC[108]

| colour obtained | number | mineral / production process |
|---|---|---|
| very, very light lilac | 694 | mineral : sardonyx<br>rock : white, slightly translucid (with a light orange-amber circular area on the surface)<br>powder : very light grey<br>origin : unknown<br><br>production process:<br>rock hermetically wrapped in bread dough / 1600 °F / 1 h (white, opaque) / irradiated with electrons at 305,200 rad[73] |
| very light lilac | 695 | mineral : amethyst<br>rock : violet, translucid<br>powder : light grey (lilac tone)<br>origin : Thunderbay, Ontario<br><br>mineral : sulphur<br>rock : brilliant yellow<br>powder : brilliant yellow<br>origin : unknown<br><br>production process:<br>2 g of amethyst + 2 g of sulphur / 1300 °F / 1 h (white [light yellow and grey reflections]) / irdiated with gamma rays at 64.7 Mrad (followed at «dark lilac [grey tone and pink reflection]») |
| very light lilac | 696 | mineral : fluorine<br>rock : violet and white, translucid<br>powder : very light grey<br>origin : Saint-Lawrence Fluorspar Company, Saint-Lawrence, Newfoundland<br><br>production process:<br>powder irradiated with gamma rays at 18.85 Mrad |
| | | production process:<br>1000 °C / 1 h (white [light yellow reflection]) / powder irradiated with gamma rays at: |
| light lilac | 697 | 63.984 Mrad |
| ↓ | | |
| lilac more | 698 | 122.984 Mrad[109] |

| | | |
|---|---|---|
| accentuated | | (followed at «medium pinkish lilac [light grey reflection]») |
| light lilac | 699 | mineral : sardonyx<br>rock : white, slightly translucid (with a light orange-amber circular area on the surface)<br>powder : very light grey<br>origin : unknown<br><br>production process:<br>rock hermetically wrapped in bread dough / 1600 °F / 1 h (white, opaque) / irradiated with gamma rays at 64.7 Mrad<br>(followed at «light pinkish lilac») |
| lilac a little lighter than «lilac»<br>↓ | 700 | mineral : vesuvianite<br>rock : lilac<br>powder : lilac<br>origin : John Mansville Mine, Asbestos, Québec<br><br>production process:<br>0↑300 °F |
| lilac still a little lighter | 701 | 0↑400 °F<br>(followed at «lilac [light beige tone]») |
| lilac more pastel et whitened than «lilac» | 702 | production process:<br>12 g of vesuvianite + 40 ml phosphoric acid / soaking: 7 d. / drying on hot plate (still humid) / colour of the solid[13] |
| lilac | 703 | mineral : fluorine<br>rock : pale grey (lilac tone), opaque<br>powder : page grey (light lilac tone)<br>origin : Saint-Lawrence Fluorspar Company, Saint-Lawrence, Newfoundland<br><br>production process:<br>1000 °C / 1 h (light beige [orange tone]) / powder irradiated with gamma rays at 64.7 Mrad<br>(followed at «very pronounced reddish violet») |
| lilac | 704 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>powder irradiated with neutrons during 2,000 sec at $10^{12}$ neutrons / $cm^2$ / sec[110] |

107

| | | |
|---|---|---|
| pronounced lilac | 705 | production process:<br>1000 °C / 1 h (white [light pink or orange reflection]) / powder irradiated with gamma rays at 64.7 Mrad<br>(followed at «very pronounced reddish violet») |
| lilac (pink tone) | | |
| very, very light pinkish lilac | 706 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (milky white [pink reflection]) / irradiated with electrons at 302,831 rad[36] |
| very, very light pinkish lilac (grey tone) or very, very light grey (pink tone and lilac reflection) | 707 | production process:<br>(followed from «grey»)<br>2 g of fluorine + 20 ml hydrochloric acid / soaking: 3 d. / drying on hot plate (milky white [pink reflection]) / irradiated with gamma rays at 64.7 Mrad<br>(followed at «light beige [light pink reflection]») |
| very, very light pinkish lilac | 708 | production process:<br>1000 °C / 1 h (white [light yellow reflection]) / powder irradiated with electrons at 302,831 rad[45] |
| light pinkish lilac | 709 | mineral : haematite<br>rock : medium chocolate-brown<br>powder : medium chocolate-brown<br>origin : Nouveau Québec, Québec<br><br>production process:<br>4 g of haematite + 200 ml phosphoric acid / soaking: 4 years / drying on hot plate (still humid) / colour of the liquid[7] |
| light pinkish | 710 | mineral : sardonyx<br>rock : white, slightly translucid (with a light orange-amber circular area on the surface)<br>powder : very light grey<br>origin : unknown<br><br>production process:<br>(followed from «light lilac»)<br>rock hermetically wrapped in bread dough / |

| | | |
|---|---|---|
| lilac | | 1600 °F / 1 h (white, opaque) / irradiated with gamma rays at 424.7 Mrad |
| pinkish lilac | 711 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>3 g of wilsonite + 100 ml nitric acid / soaking: 4 years / drying on hot plate[112] |
| pinkish lilac a little darker than «pinkish lilac» | 712 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>rock irradiated with electrons at 162,431 rad<br><br>(followed at «reddish violet») |
| light pinkish lilac ↓ pronounced pinkish lilac | 713<br>714<br>715 | <u>production process:</u><br>powder irradiated with gamma rays at:<br>64.7 Mrad<br>65.704 Mrad<br>244.53 Mrad<br>(followed at «medium reddish lilac») |
| pinkish lilac (grey tone) | | |
| light pinkish lilac (grey tone) | 716 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>(followed from «pale greyish lilac»)<br>powder irradiated with electrons at 302,831 rad[45] |
| | 717 | mineral : ochre[111]<br>powder : dark reddish brown<br>origin : Red Mill, in the suburbs of Cap-de-la-Madeleine, Québec<br><br>mineral : titanium dioxide |

| | | |
|---|---|---|
| | | powder : white<br>origin : NL Chem Canada Inc., Québec<br><br><u>production process:</u><br>(followed from «iron-grey [light pinkish tone] darker than "light iron-grey [light pinkish tone]"»)<br>1 g of ochre + 2 g of titanium dioxide: |
| lighter pinkish lilac (very light grey tone)<br>│ | 718 | 0↑1300 °F |
| pinkish lilac a bit darker<br>↓ | 719 | 0↑1500 °F |
| pinkish lilac still a bit darker | 720 | 0↑1700 °F<br><br>(followed at «light beige ochre») |
| | | mineral : fluorine<br>rock : violet and white, translucid<br>powder : very light grey<br>origin : Saint-Lawrence Fluorspar Company, Saint-Lawrence, Newfoundland<br><br><u>production process:</u><br>(followed from «lilac more pronounced than "light lilac"») |
| medium pinkish lilac (light grey reflection) | 721 | 1000 °C / 1 h (white [light yellow reflection]) / powder irradiated with gamma rays at 482.984 Mrad |
| lilac (red tone) | | |
| | | mineral : goethite[106]<br>powder : orange rust<br>origin : Red Mill, in the suburbs of Cap-de-la-Madeleine, Québec<br><br>mineral : titanium dioxide<br>powder : white<br>origin : NL Chem Canada Inc., Québec<br><br><u>production process:</u><br>(followed from «dark milky chocolate-brown»)<br>.50 g of goethite + 1.50 g of titanium dioxide: |
| light lilac | 722 | 0↑ 500 °F |
| │ | 723 | 0↑ 800 °F |
| which evolves to | 724 | 0↑ 900 °F |
| │ | 725 | 0↑1000 °F |
| │ | 726 | 0↑1100 °F |
| ↓ | 727 | 0↑1200 °F |
| more intense | 728 | 0↑1300 °F |

110

| | | |
|---|---|---|
| reddish lilac | | (followed at «light caput-mortuum [violet and pink reflection]») |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «pronounced pinkish lilac»)<br>powder irradiated with gamma rays at: |
| medium reddish lilac ↓ | 729 | 424.7 Mrad |
| medium lilac (near the «pale reddish violet») | 730 | 604.53 Mrad |
| | | mineral : goethite[106]<br>powder : orange rust<br>origin : Red Mill, in the suburbs of Cap-de-la -Madeleine, Québec<br><br>mineral : titanium dioxide<br>powder : white<br>origin : NL Chem Canada Inc., Québec<br><br>production process:<br>(followed from «caput-mortuum [red-violet tone]»)<br>1 g of goethite + 1.50 g of titanium dioxide: |
| dark lilac | 731 | 0↑ 500 °F |
| \| | 732 | 0↑ 800 °F |
| which evolves to | 733 | 0↑ 900 °F |
| \| | 734 | 0↑1000 °F |
| \| | 735 | 0↑1100 °F |
| ↓ | 736 | 0↑1200 °F |
| dark lilac (red tone) | 737 | 0↑1300 °F<br>(followed at «caput-mortuum [brown tone]») |
| lilac (beige tone) | | |
| | | mineral : vesuvianite<br>rock : lilac<br>powder : lilac<br>origin : John Mansville Mine, Asbestos, Québec<br><br>production process:<br>(followed from «lilac lighter than "lilac"») |
| lilac (light beige tone) | 738 | 0↑500 °F<br>(followed at «lilac [light grey tone]») |

| | | |
|---|---|---|
| pale lilac (beige tone)<br>↓<br>more accentuated lilac (beige tone)<br>↓<br>lilac (beige tone and orange reflection) | 739 | production process:<br>0↑300 °F (lilac a little lighter than «lilac»): .50 g + 40 ml hydrochloric acid / natural drying |
| | 740 | 0↑500 °F (lilac [light beige tone]): .50 g + 40 ml hydrochloric acid / natural drying<br>(followed at «very pale greyish lilac»)<br>(followed from «very pale greyish lilac») |
| | 741 | 0↑1400 °F (very light pink): .50 g + 40 ml hydrochloric acid / natural drying |
| lilac (grey tone) | | |
| very pale greyish lilac | 742 | mineral : vesuvianite<br>rock : lilac<br>powder : lilac<br>origin : John Mansville Mine, Asbestos, Québec<br>production process:<br>(followed from «lilac [light beige tone]»)<br>0↑1300 °F (white [pink reflection]): .50 g + 40 ml hydrochloric acid / natural drying<br>(followed at «lilac [beige tone and orange reflection]») |
| pale lilac (light grey tone) | 743 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br>production process:<br>powder irradiated with electrons at 302,831 rad[34] |
| pale lilac (grey tone) | 744 | mineral : fluorine<br>rock : pinkish lilac, opaque<br>powder : very light grey (lilac tone), almost white<br>origin : Saint-Lawrence Fluorspar Company, Saint-Lawrence, Newfoundland<br>production process:<br>powder irradiated with electrons at 162,431 rad<br>(followed at «light pinkish lilac [grey tone]») |
| | | mineral : chromite<br>rock : blackish grey<br>powder : medium brownish grey<br>origin : Black Lake, near Thetford Mines, |

112

| | | |
|---|---|---|
| | | Québec |
| light lilac (grey tone) | 745 | <u>production process:</u><br>4 g of chromite + 100 ml sulphuric acid / soaking: 4 years / drying on hot plate / colour of the liquid[113] |
| | | mineral : vesuvianite<br>rock : lilac<br>powder : lilac<br>origin : John Mansville Mine, Asbestos, Québec |
| lilac (light grey tone) ↓ | 746 | <u>production process:</u><br>(followed from «lilac [light beige tone]»)<br>0↑600 °F |
| lilac (accentuated grey tone) | 747 | 0↑700 °F<br>(followed at «grey [lilac tone]») |
| | | mineral : amethyst<br>rock : violet, translucid<br>powder : light grey (lilac tone)<br>origin : Thunderbay, Ontario |
| | | mineral : sulphur<br>rock : brilliant yellow<br>powder : brilliant yellow<br>origin : unknown |
| dark greyish lilac (pink reflection) | 748 | <u>production process:</u><br>(followed from «very light lilac»)<br>2 g of amethyst + 2 g of sulphur / 1300 °F / 1 h (white [light yellow and grey reflections]) / irradiated with gamma rays at 424.7 Mrad |
| mixture of particles | | |
| | | mineral : wilsonite, local variety of scapolite or wernerite<br>rock : grey (violet tone)<br>powder : light grey (lilac tone)<br>origin : Tetreault Mine, Montauban, Portneuf county, Québec |
| pale pinkish lilac / pale beige (grey tone) | 749 | <u>production process:</u><br>3 g of wilsonite + 50 ml nitric acid / soaking: 2 wk. / drying on hot plate (very light beige [pink tone, orange reflection]) / irradiated with electrons at 302,831 rad[36] |
| | | mineral : smaltite[25], a variety of skutterudite<br>rock : dark iron-grey, with a silver |

| | | |
|---|---|---|
| | | metallic brilliance<br>powder : dark grey<br>origin : Cobalt, Ontario |
| very pronounced pink lilac / dark grass-green | 750 | production process:<br>(followed from «darker reddish brown and more red than "reddish brown"»)<br>0↑1900 °F (dark brown): .30 g + 50 ml nitric acid / soaking: 2 wk. / drying on hot plate (reddish brown) / irradiated with gamma rays at 424.7 Mrad |
| pinkish lilac more intense and accentuated than «very vivid pinkish lilac» / grass-green more intense and accentuated than «dark and very vivid grass-green» | 751 | production process:<br>(followed from «emerald-green much more intense than "very vivid emerald-green"»)<br>3 g of smaltite + 80 ml hydrochloric acid / soaking: 2 wk. / separation of the liquid and the solid / drying on hot plate (colour of the liquid: very vivid green) / irradiated with gamma rays at 424.7 Mrad |

VIOLET

| colour obtained | number | mineral / production process |
|---|---|---|
| | 752 | mineral : erythrite<br>rock : accentuated pink (lilac tone)<br>powder : light pink (lilac tone)<br>origin : Guatemala |
| light violet (or mauve) | 753 | <u>production process:</u><br>450 °F / 10 min.[115] |
| pronounced pastel violet | 754 | mineral : goethite[106]<br>powder : orange rust<br>origin : Red Mill, in the suburbs of Cap-de-la-Madeleine, Québec<br><br>mineral : titanium dioxide<br>powder : white<br>origin : NL Chem Canada Inc., Québec<br><br><u>production process:</u><br>(followed from «caput-mortuum [accentuated reddish lilac tone]»)<br>.50 g of goethite + 1 g of titanium dioxide / 0↑1400 °F<br>(followed at «medium caput mortuum [light pink tone]») |
| violet | 755 | mineral : goethite[106]<br>powder : orange rust<br>origin : Red Mill, in the suburbs of Cap-de-la-Madeleine, Québec<br><br><u>production process:</u><br>(followed from «reddish violet»)<br>0↑2000 °F[116,117] |
| | | mineral : goethite[106]<br>powder : orange rust<br>origin : Red Mill, in the suburbs of Cap-de-la-Madeleine, Québec<br><br>mineral : animal charcoal<br>powder : black<br>origin : Anachemia Chemicals Ltd., Montréal, Québec |

| | | |
|---|---|---|
| | | production process: |
| | | the goethite is heated 0↑2000 °F |
| | | (violet): |
| violet which | 755.1 | 1 g + .25 g of animal charcoal / grinding |
| \| | | |
| becomes progres- | 755.2 | 1 g + .50 g of animal charcoal / grinding |
| ↓ sively | | |
| blackish violet | 755.3 | 1 g + 1 g of animal charcoal / grinding |
| | | mineral : fluorine |
| | | rock : colourless |
| | | powder : colourless |
| | | origin : Ohio, United States |
| | | |
| | | production process: |
| | | (followed at «dark brown [violet tone]») |
| violet | 756 | 1 g of fluorine + 1 cc of white transparent synthetic enamel paint for the car / manual grinding / application on a piece of steel sheet for the body measuring 1" x 1" (light greyish cream) / irradiated with gamma rays at 360 Mrad[118] |
| | | mineral : amethyst |
| | | rock : violet, translucid |
| | | powder : light grey (lilac tone) |
| | | origin : Thunderbay, Ontario |
| | | |
| | | production process: |
| | | rock irradiated with gamma rays at: |
| violet darker than «violet» | 757 | 63.984 Mrad |
| \| | | |
| violet much darker | 758 | 242.804 Mrad |
| ↓ | | |
| violet still much darker | 759 | 602.804 Mrad[120] |
| | | production process: |
| | | rock irradiated with electrons at: |
| violet a little more accentuated than «violet» | 760 | 162,431 rad |
| \| | | |
| violet (very light beige tone) | 761 | 164,800 rad |
| ↓ | | |
| violet more intense and a little darker | 762 | 302,831 rad[45] |

| | | |
|---|---|---|
| | | mineral : fluorine<br>rock : violet and white, translucid<br>powder : very light grey<br>origin : Saint-Lawrence Fluorspar Company, Saint-Lawrence, Newfoundland<br><br>production process:<br>rock irradiated with electrons at: |
| violet darker than «violet» | 763 | 164,800 rad |
| ↓ | | |
| violet still a little darker | 764 | 305,200 rad[73] |
| violet darker than «violet» | 765 | production process:<br>rock entirely covered with 20 ml hydrochloric acid / soaking: 2 wk. / irradiated with gamma rays at 5.7 Mrad / drying on sand bath, completed on hot plate[122] |
| | 766 | mineral : copper<br>rock : reddish brown, with metallic luster<br>powder : reddish brown, with metallic luster<br>origin : unknown<br><br>production process:<br>rock all covered with 1000 ml acetic acid / natural drying / removal of the crystals formed at the surface of the rock (colour of the crystals: pronounced emerald-green): |
| variety of violets, blues (violet tone), bluish greens and blues; all very vivid | 767 | 1 g + 1 ml ammonia / natural drying |
| | 768 | 1 g + 2 ml ammonia / natural drying |
| | 769 | 1 g + 3 ml ammonia / natural drying |
| | 770 | 1 g + 4 ml ammonia / natural drying (very intense blue [violet tone]) |
| ↓ | 771 | 1 g + 5 ml ammonia / natural drying |
| | 772 | 1 g + 10 ml ammonia / natural drying |
| | 773 | 1 g + 15 ml ammonia / natural drying |
| | 774 | 1 g + 20 ml[222] ammonia / natural drying |
| | 775 | 1 g + 25 ml ammonia / natural drying |
| | 776 | 5 g + 25 ml ammonia / natural drying (very intense greenish blue) |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>mineral : sulphur<br>rock : brilliant yellow<br>powder : brilliant yellow<br>origin : unknown |

117

| | | |
|---|---|---|
| very accentuated violet | 777 | production process:<br>(followed from «medium violet [blue tone]»)<br>2 g of fluorine + 2 g of sulphur / 1300 °F / 1 h (light beige [light pink tone, orange reflection]) / irradiated with gamma rays at 424.7 Mrad |
| very intense violet | 778 | mineral : fluorine<br>rock : very pale yellow, translucid<br>powder : white (light yellow reflection)<br>origin : Ohio, United States<br><br>production process:<br>1500 °F / 1 h (white, semi-opaque) / rock irradiated with gamma rays at 64.7 Mrad[119]<br>(followed at «very dark reddish violet») |
| very pronounced violet<br>↓<br>more intense violet | 779<br><br>780 | mineral : fluorine<br>rock : light pink, translucid<br>powder : white (light pink reflection)<br>origin : Saint-Lawrence Fluorspar Company, Saint-Lawrence, Newfoundland<br><br>production process:<br>1000 °C / 1 h (white [yellow reflection]) / powder irradiated with gamma rays at:<br>63.984 Mrad<br><br>122.984 Mrad<br>(followed at «medium beige [light orange tone]») |
| dark violet, quite accentuated | 781 | mineral : fluorine<br>rock : very pale yellow, translucid<br>powder : white (light yellow reflection)<br>origin : Ohio, United States<br><br>production process:<br>(followed from «medium iron-grey [light lilac tone]»)<br>1 g of fluorine + 1 cc of white transparent synthetic enamel paint for the car / manual grinding / application on a piece of steel sheet for the body measuring 1" x 1" (greyish cream) / irradiated with gamma rays at 7.54 Mrad[127]<br>(followed at «medium pinkish violet») |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>(followed from «iron-grey [light lilac tone]») |

| | | |
|---|---|---|
| dark violet | 782 | 1 g of fluorine + 1 cc of white transparent synthetic enamel paint for the car / manual grinding / application on a piece of steel sheet for the body measuring 1" x 1" (light grey) / irradiated with gamma rays at 57.4 Mrad[121] (followed at «dark charcoal-grey [light violet tone]») |
| dark violet | 783 | mineral : goethite[106]<br>powder : orange rust<br>origin : Red Mill, in the suburbs of Cap-de-la-Madeleine, Québec<br><br>production process:<br>0↑1400 °F / slow cooling in furnace (indian red[107]) / 1600 °F / 1 h |
| dark violet | 784 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (light brown) / irradiated with gamma rays at 18.85 Mrad |
| dark violet | 785 | production process:<br>2 g of fluorine + 20 ml nitric acid / soaking: 3 d. / drying on hot plate (dark milky chocolate-brown)/ irradiated with gamma rays at 18.85 Mrad |
| dark violet | 786 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml nitric acid / soaking: 3 d. / drying on hot plate (medium pink [orange tone]) / irradiated with gamma rays at 18.85 Mrad |
| | | mineral : fluorine<br>rock : very pale yellow, translucid<br>powder : white (light yellow reflection)<br>origin : Ohio, United States<br><br>mineral : cement[1138]<br>powder : white |

119

| | | |
|---|---|---|
| | | <u>production process:</u><br>(followed from «reddish violet») |
| dark violet<br>↓ | 787 | 5 g of rocks[123,124] of different sizes + 13.74 g of cement + 6.50 cc of water / manual mixing / moulding / hardening / 0↑600 °F / cooling / irradiated with gamma rays at 18.85 Mrad[125] / colour of the rocks[126] |
| very dark violet | 788 | 5 g of rocks of different sizes + 13.74 g of cement + 6.50 cc of water / manual mixing / moulding / hardening / 0↑1300 °F / cooling / irradiated with gamma rays at 18.85 Mrad / colour of the rocks[126]<br>(followed at «very dark indigo-blue») |
| | 789 | mineral : ochre[128]<br>powder : black<br>origin : Red Mill, in the suburbs of Cap-de-la-Madeleine, Québec |
| | 790 | mineral : table salt (NaCl)<br>powder : colourless<br>origin : Sifto Company |
| | | <u>production process:</u><br>(followed from «brown [light red tone and violet reflection]») |
| dark violet | 791 | 10 g of ochre + 10 g of NaCl / 0↑1700 °F / slow cooling in furnace |
| | | mineral : smaltite[25], variety of skutterudite<br>rock : dark iron-grey, with silver metallic brilliance<br>powder : dark grey<br>origin : Cobalt, Ontario |
| | | <u>production process:</u> |
| dark violet | 792 | 0↑1900 °F (dark brown): .30 g + 50 ml hydrochloric acid / soaking: 2 wk. / separation of the liquid and the solid / drying on hot plate (colour of the liquid: very intense peacock-blue) / the «peacock-blue» powder is heated on a hot plate 0↑700 °F / colour of the resulting powder |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland |
| | | <u>production process:</u><br>rock hermetically wrapped in bread dough / 1600 °F / 1 h (chalk-white [with orange areas]) / irradiated with gamma rays at: |

| | | |
|---|---|---|
| dark violet | 793 | 64.7 Mrad |
| ↓ | | |
| very dark and saturated violet | 794 | 424.7 Mrad |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process</u>:<br>(followed from «grey [lilac tone] darker than "pale grey [lilac tone]"»)<br>rock irradiated with gamma[228] rays at: |
| dark violet | 795 | 63.984 Mrad |
| \| | | |
| darker violet | 796 | 102.4 Mrad[128a] |
| \| | | |
| very dark violet | 797 | 122.984 Mrad[128b] |
| \| | | |
| still darker violet | 798 | 148.4 Mrad |
| \| | | |
| still darker violet | 799 | 201.6 Mrad |
| \| | | |
| a little darker violet | 800 | 247.6 Mrad |
| \| | | |
| considerably darker violet | 801 | 287.3 Mrad |
| \| | | |
| still darker violet | 802 | 360 Mrad |
| ↓ | | |
| still darker violet | 803 | 423.984 Mrad<br>(followed at «blackish brown») |
| | | mineral : haematite<br>rock : medium chocolate-brown<br>powder : medium chocolate-brown<br>origin : Nouveau Québec, Québec<br><br><u>production process</u>:<br>(followed from «dark brown [violet tone]») |
| blackish violet or dark grey (violet tone) | 804 | 0↑1950 °F |
| | | mineral : amethyst<br>rock : light violet, translucid<br>origin : Lac Sairs, Témiscamingue, Québec |

| | | |
|---|---|---|
| violet a little darker<br>darkens towards ↓<br>blackish violet | 805<br>806<br>807<br>808<br>809<br>810<br>811<br>812<br>813<br>814 | production process:<br>rock irradiated with gamma rays at:<br>5 Mrad<br>10 Mrad<br>57.4 Mrad<br>102.4 Mrad<br>148.4 Mrad<br>201.6 Mrad<br>247.6 Mrad<br>287.3 Mrad<br>360 Mrad<br>424.7 Mrad[129] |
| violet (pink tone) | | |
| light and vivid pinkish violet | 815 | mineral : vesuvianite<br>rock : lilac<br>powder : lilac<br>origin : John Mansville Mine, Asbestos, Québec<br><br>production process:<br>rock hermetically wrapped in bread dough / 1600 °F / 30 min.[130] |
| pinkish violet a little more intense than «light and vivid pinkish violet» | 816 | production process:<br>rock hermetically wrapped in bread dough / 1600 °F / 30 min. (light and vivid pinkish violet): .63 g + 40 ml hydrochloric acid / natural drying |
| | | mineral : fluorine<br>rock : very pale yellow, translucid<br>powder : white (light yellow reflection)<br>origin : Ohio, United States<br><br>production process:<br>(followed from «dark violet, quite accentuated»)<br>1 g of fluorine + 1 cc of white transparent synthetic enamel paint for the car / manual grinding / application on a piece of steel sheet for the body measuring 1" x 1" (greyish cream) / irradiated with gamma rays at: |
| medium pinkish violet | 817 | 10 Mrad |
| pinkish violet considerably more accentuated | 818 | 11.31 Mrad |
| pinkish violet still much more accentuated | 819 | 15.08 Mrad |

| | | |
|---|---|---|
| pinkish violet still a little more accentuated | 820 | 18.85 Mrad |
| ↓ | | |
| intense reddish violet | 821 | 57.4 Mrad (followed at «dark greyish brown [light violet tone]») |
| violet (red tone) | | |
| reddish violet | 822 | mineral : fluorine<br>rock : colourless<br>powder : colourless<br>origin : Ohio, United States<br><br>production process:<br>1500 °F / 1 h (white, semi-opaque) / rock irradiated with gamma rays at 424.7 Mrad[131] |
| reddish violet | 823 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «pinkish lilac a little darker than "pinkish lilac"»)<br>rock irradiated with electrons at 302,831 rad[45] |
| | | mineral : fluorine<br>rock : very pale yellow, translucid<br>powder : white (light yellow reflection)<br>origin : Ohio, United States<br><br>production process:<br>(followed from «blue [violet tone] more intense than "blue [violet tone]"»)<br>rock irradiated with gamma rays at: |
| reddish violet | 824 | 57.4 Mrad |
| ¦ | | |
| reddish violet more intense | 825 | 102.4 Mrad[132] |
| ¦ | | |
| reddish violet still more intense | 826 | 148.4 Mrad[133] |
| ¦ | | |
| reddish violet still more intense | 827 | 201.6 Mrad |
| ¦ | | |
| reddish violet | 828 | 247.6 Mrad |

123

| | | |
|---|---|---|
| still more intense<br>↓ | | |
| reddish violet more intense<br>↓ | 829 | 287.3 Mrad |
| reddish violet still more intense<br>↓ | 830 | 360 Mrad |
| reddish violet still more intense | 831 | 424.7 Mrad |
| reddish violet | 832 | mineral : fluorine<br>rock : very pale yellow, translucid<br>powder : white (light yellow reflection)<br>origin : Ohio, United States<br><br>mineral : cement[113B]<br>powder : white<br><br>production process:<br>5 g of rocks of various sizes + 13.74 g of white cement[113B] + 6.50 cc of water / manual mixing / moulding / hardening / irradiated with gamma rays at 18.85 Mrad / colour of the rocks[134]<br>(followed at «dark violet») |
| reddish violet | 833 | mineral : goethite[106]<br>powder : orange rust<br>origin : Red Mill, in the suburbs of Cap-de-la-Madeleine, Québec<br><br>production process:<br>(followed from «indian red [violet tone]»)<br>0↑1900 °F<br>(followed at «violet») |
| reddish violet more blue than «reddish violet» | 834 | mineral : fluorine<br>rock : reddish violet, translucid<br>powder : very light grey<br>origin : Ohio, United States<br><br>production process:<br>rock irradiated with electrons at 164,800 rad[122]<br><br>(followed at «blue-violet [light red tone]») |
| | | mineral : fluorine<br>rock : violet and white, translucid<br>powder : very light grey |

| | | |
|---|---|---|
| | | origin : Saint-Lawrence Fluorspar Company, Saint-Lawrence, Newfoundland |
| | | mineral : sulphur<br>rock : brilliant yellow<br>powder : brilliant yellow<br>origin : unknown |
| medium reddish violet (grey tone) | 835 | <u>production process:</u><br>(followed from «greyish beige [light pinkish violet tone or pink tone with violet reflection]») 2 g of fluorine + 2 g of sulphur / 1300 °F / 1 h (light greyish beige) / irradiated with gamma rays at 424.7 Mrad |
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec |
| vivid reddish violet | 836 | <u>production process:</u><br>0↑1600 °F (light milky chocolate-brown): .20 g + 100 ml phosphoric acid / soaking: 4 years / drying on hot plate (still humid) / colour of the liquid[135] |
| | | mineral : fluorine<br>rock : pinkish lilac, opaque<br>powder : very clear grey (lilac tone), almost white<br>origin : Saint-Lawrence Fluorspar Company, Saint-Lawrence, Newfoundland |
| | | <u>production process:</u><br>rock irradiated with gamma rays at: |
| accentuated reddish violet | 837 | 5 Mrad |
| accentuates and darkens towards | 838 | 10 Mrad |
| | 839 | 57.4 Mrad |
| | 840 | 102.4 Mrad |
| | 841 | 148.4 Mrad |
| | 842 | 201.6 Mrad |
| | 843 | 247.6 Mrad |
| | 844 | 287.3 Mrad |
| blackish violet ↓ | 845 | 360 Mrad |
| black-violet | 846 | 604.53 Mrad |
| | | mineral : fluorine<br>rock : violet and white, translucid |

125

| | | |
|---|---|---|
| | | powder : very light grey<br>origin : Saint-Lawrence Fluorspar Company, Saint-Lawrence, Newfoundland<br><br><u>production process:</u><br>rock irradiated with gamma rays at: |
| violet | 847 | 5 Mrad |
| ↓ | 848 | 10 Mrad |
| which accentuates | 849 | 57.4 Mrad |
| ↓ towards | 850 | 65.704 Mrad |
| pronounced reddish violet | 851 | 102.4 Mrad |
| | 852 | 148.4 Mrad |
| ↓ then to | 853 | 201.6 Mrad |
| dark reddish violet | 854 | 244.53 Mrad[122] |
| ↓ and then | 855 | 247.6 Mrad |
| ↓ | 856 | 287.3 Mrad |
| very dark reddish violet | 857 | 360 Mrad |
| ↓ | 858 | 425.704 Mrad |
| ↓ | 859 | 604.53 Mrad[120] |
| | | mineral : pyrolusite<br>rock : black (light brown tone), mat<br>powder : black (light brown tone), mat<br>origin : probably Nova Scotia<br><br><u>production process:</u> |
| very pronounced reddish violet | 859.1 | 1 g of pyrolusite + 6.50 g of glass powder (spruce pine batch) / manual grinding / deposit on a ceramic plate at the state of biscuit / heating in a furnace from 0 to 1000 °C in normal atmosphere / slow cooling in the furnace |
| | | <u>production process:</u><br>1 g of pyrolusite + 6.50 g of glass powder (spruce pine batch) / manual grinding / deposit on a ceramic plate at the state of biscuit / heating in a furnace from 0 to 1000 °C in normal atmosphere / slow cooling in the surface (very pronounced reddish violet) / irradiated with gamma rays at: |
| reddish violet a little darker than «intense reddish violet» | 859.2 | 2.47 Mrad |
| ↓ | | |
| darker reddish violet | 859.3 | 4.94 Mrad |
| ↓ | | |
| reddish violet a little darker | 859.4 | 7.41 Mrad |

| | | |
|---|---|---|
| ↓<br>reddish violet still a little darker | 859.5 | 9.88 Mrad |
| very pronounced reddish violet | 860 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «pronounced lilac»)<br>1000 °C / 1 h (white [light pink or orange reflection]) / powder irradiated with gamma rays at 424.7 Mrad |
| very pronounced reddish violet | 861 | mineral : fluorine<br>rock : very pale yellow, translucid<br>powder : white (light yellow reflection)<br>origin : Ohio, United States<br><br>production process:<br>rock irradiated with electrons at 155,082 rad (peacock-blue) and, then, with gamma rays at 148.4 Mrad[136]<br>(followed at «violet-blue [red tone], very saturated») |
| very pronounced reddish violet | 862 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>(followed from «lilac»)<br>1000 °C / 1 h (light beige [orange tone]) / powder irradiated with gamma rays at 424.7 Mrad |
| | | mineral : fluorine<br>rock : colourless<br>powder : colourless<br>origin : Ohio, United States<br><br>production process:<br>(followed from «blue tone»)<br>rock irradiated with gamma rays at: |
| reddish violet<br>↓ | 863 | 102.4 Mrad |
| reddish violet a little more accentuated<br>↓ | 864 | 148.4 Mrad |

| | | |
|---|---|---|
| reddish violet considerably more accentuated | 865 | 201.6 Mrad[139] |
| ↓ | | |
| reddish violet still more accentuated | 866 | 247.6 Mrad |
| ↓ | | |
| reddish violet considerably more accentuated | 867 | 287.3 Mrad |
| ↓ | | |
| reddish violet still more accentuated | 868 | 360 Mrad |
| ↓ | | |
| reddish violet very accentuated | 869 | 424.7 Mrad[138] |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process: |
| dark reddish violet | 870 | powder irradiated with gamma rays at 18.85 Mrad |
| dark reddish violet | 871 | production process:<br>2 g of fluorine + 20 ml ether / natural drying (white) / irradiated with gamma rays at 18.85 Mrad |
| dark reddish violet | 872 | production process:<br>2 g of fluorine + 20 ml ammonia / natural drying (white) / irradiated with gamma rays at 18.85 Mrad |
| | | mineral : fluorine<br>rock : reddish violet, translucid<br>powder : very light grey<br>origin : Ohio, United States<br><br>production process:<br>rock irradiated with gamma rays at: |
| reddish violet much more accentuated than «reddish violet» | 873 | 5 Mrad |
| ↓ | 874 | 10 Mrad |
| which evolves to | 875 | 57.4 Mrad |

| | | |
|---|---|---|
| violet (red tone more accentuated) | 876 | 102.4 Mrad |
| and then | 877 | 148.4 Mrad |
| | 878 | 201.6 Mrad |
| | 879 | 247.6 Mrad[137] |
| | 880 | 287.3 Mrad |
| ↓ | 881 | 360 Mrad[138] |
| darker and more accentuated reddish violet | 882 | 430.4 Mrad |
| very dark reddish violet | 883 | mineral : fluorine<br>rock : very pale yellow, translucid<br>powder : white (light yellow reflection)<br>origin : Ohio, United States<br><br>production process:<br>(followed at «very intense violet»)<br>1500 °F / 1 h (white, semi-opaque) / rock irradiated with gamma rays at 424.7 Mrad[139] |
| dark reddish violet | 884 | mineral : fluorine<br>rock : very light fluor-green (cold mint-type), translucid<br>powder : very light grey<br>origin : Rogers Mine, Madoc, Ontario<br><br>mineral : cement[1138]<br>powder : white<br><br>production process:<br>(followed from «intense peacock-blue [grey tone]»)<br>5 g of rocks of various sizes + 13.74 g of white cement[1138]+6.50 cc of water / manual mixing / moulding / hardening / 0↑1900 °F / cooling / irradiated with gamma rays at 18.85 Mrad / colour of the rocks[140] |
| crimson-violet | | |
| | | mineral : goethite[106]<br>powder : orange rust<br>origin : Red Mill, in the suburbs of Cap-de-la-Madeleine, Québec<br><br>mineral : calcite[11]<br>powder : white<br>origin : Calcite du Nord Company, Saint-Eugène de Mistassini, Lac Saint-Jean, Québec |

129

| | | |
|---|---|---|
| | | <u>production process:</u><br>the goethite is heated 0 °F to 2000 °F (violet): |
| crimson-violet | 884.1 | 1 g + .50 g of calcite / grinding |
| ↓ lighter crimson-violet | 884.2 | 1 g + 1 g of calcite / grinding |
| ↓ very, very light crimson-violet | 884.3 | 1 g + 1.50 g of calcite / grinding |
| crimson-violet | 885 | mineral : wilsonite (local variety of scapolite or wernerite)<br>rock : grey (violet tone)<br>powder : light grey (lilac tone)<br>origin : Tetreault Mine, Montauban, Portneuf county, Québec<br><br><u>production process:</u><br>(followed from «grey [lilac tone]»)<br>rock irradiated with gamma rays at 242.804 Mrad (followed at «orange [light pinkish lilac reflection]») |
| crimson-violet | 886 | mineral : pyrolusite[101]<br>rock : black (light brown tone), mat<br>powder : black (light brown tone), mat<br>origin : probably Nova Scotia<br><br><u>production process:</u><br>110 g of pyrolusite + 150 ml phosphoric acid / soaking: 2 wk. / separation of the liquid and the solid / drying on hot plate (still humid) / colour of the 1st liquid |
| ↓ more intense and darker crimson-violet | 887 | 110 g of pyrolusite + 150 ml phosphoric acid / soaking: 2 wk. / separation of the liquid[583] and the solid / drying on hot plate (colour of the 1st liquid: crimson violet [still humid] / addition of 150 ml phosphoric acid to the same solid / soaking: 1 wk. / boiling on hot plate during 2 d. / separation of the 2nd liquid + the solid / colour of the 2nd liquid |
| intense crimson-violet (almost opaque) | 888 | <u>production process:</u><br>1000 °C / 12 h (brownish black): 60 g + 200 ml phosphoric acid / immediately deposited on hot plate / boiling during 2 d. / colour of the liquid (followed at «old pink [lilac tone]» and «brownish black [accentuated violet tone]») |

| | | |
|---|---|---|
| crimson-violet (amber tone) | | |
| | | mineral : pyrolusite[101]<br>rock : black (light brown tone), mat<br>powder : black (light brown tone), mat<br>origin : probably Nova Scotia |
| crimson-violet (amber tone) | 889 | <u>production process:</u><br>110 g of pyrolusite + 150 ml phosphoric acid / soaking: 2 wk. / separation of the liquid and the solid / drying on hot plate [still humid] (colour of the 1st liquid: crimson-violet) / the «crimson-violet» is irradiated with electrons at 164,800 rad |
| brownish violet | | |
| | | mineral : fluorine<br>rock : reddish violet, translucid<br>powder : very light grey<br>origin : Ohio, United States<br><br>mineral : sulphur<br>rock : brilliant yellow<br>powder : brilliant yellow<br>origin : unknown |
| brownish violet | 890 | <u>production process:</u><br>(followed from grey [violet tone]»)<br>1 g of fluorine + 1 g of sulphur / 1700 °F / 1 h (very, very light grey [beige tone]) / irradiated with gamma rays at 425.65 Mrad |
| | | mineral : fluorine<br>rock : very pale yellow, translucid<br>powder : white (light yellow reflection)<br>origin : Ohio, United States<br><br>mineral : sulphur<br>rock : brilliant yellow<br>powder : brilliant yellow<br>origin : unknown |
| brownish violet | 891 | <u>production process:</u><br>(followed at «blue [violet tone]»)<br>1 g of fluorine + 1 g of sulphur / 1700 °F / 1 h (very light grey) / irradiated with gamma rays at 425.65 Mrad |
| | | mineral : fluorine<br>rock : very light fluor-green (cold mint-green type), translucid<br>powder : very light grey |

131

| | | |
|---|---|---|
| dark brownish violet | 892 | origin : Rogers Mine, Madoc, Ontario<br><br>mineral : sulphur<br>rock : brilliant yellow<br>powder : brilliant yellow<br>origin : unknown<br><br>production process:<br>(followed at «blue [violet tone]»)<br>1 g of fluorine + 1 g of sulphur / 1700 °F / 1 h (very light grey) / irradiated with gamma rays at 425.65 Mrad |
| dark brownish violet | 893 | mineral : goethite[106]<br>powder : orange rust<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «brown [violet tone]» and «brown [violet tone] darker than "brown [violet tone]"»)<br>0↑1400 °F / slow cooling in furnace (indian red[107]):<br>2 g + 2 g of sulphur / 1600 °F / 1 h[141]<br><br>(followed at «brownish grey»)<br><br>(followed from «brown [violet tone] darker than "brown [violet tone]"») |
| dark violet (accentuated brown tone) | 894 | 2 g + 6 g of sulphur / 1600 °F / 1 h<br><br>(followed at «grey colder and lighter than "grey"»)<br>(followed from «brown [violet tone] darker than "brown [violet tone]"») |
| dark violet (brown tone still more accentuated) | 895 | 2 g + 12 g of sulphur / 1600 °F / 1 h<br>(followed at «grey lighter than "grey"»)<br><br>(followed from «brown [violet tone] darker than "brown [violet tone]"») |
| ↓<br>dark violet (brown tone still more accentuated) | 896 | 2 g + 24 g of sulphur / 1600 °F / 1 h<br>(followed at «grey [brown tone]» and «grey lighter than "grey"») |
| greyish violet | | |

| | | |
|---|---|---|
| | 897 | mineral : lapis lazuli<br>rock : dark ultramarine[141a]-blue<br>powder : pale ultramarine-blue<br>origin : Afghanistan |
| light ashen violet | 898 | production process:<br>0↑1400 °F |
| | | mineral : fluorine<br>rock : reddish violet, translucid<br>powder : very light grey<br>origin : Ohio, United States |
| cold and very intense greyish violet | 899 | production process:<br>1500 °F / 1 h (white, semi-opaque) / rock irradiated with gamma rays at 424.7 Mrad[131] |
| quite dark violet [grey tone] or quite dark greyish violet | 900 | production process:<br>(followed from «medium chocolate-brown»)<br>1 g of fluorine + 1 cc of white transparent synthetic enamel paint for the car / manual grinding / application on a piece of steel sheet for the body measuring 1" x 1" (greyish cream) / irradiated with gamma rays at 360 Mrad[142] |
| mixture of particles | | |
| | | mineral : amethyst<br>rock : violet, translucid<br>powder : light grey [lilac tone]<br>origin : Thunderbay, Ontario<br><br>mineral : sulphur<br>rock : brilliant yellow<br>powder : brilliant yellow<br>origin : unknown |
| light crimson-violet / grey [violet tone] | 901 | production process:<br>2 g of amethyst + 2 g of sulphur / 1300 °F / 1 h (white [light yellow and grey reflections]) / irradiated with electrons at 302,831 rad[36] |
| | | mineral : smaltite[25], variety of skutterudite<br>rock : dark iron-grey, with silver metallic brilliance<br>powder : dark grey<br>origin : Cobalt, Ontario |
| violet / crimson / white | 902 | production process:<br>3 g of smaltite + 80 ml phosphoric acid / soaking: 2 wk. / drying on hot plate (still humid)[85] |

VIOLET (BLUE TONE)

| colour obtained | number | mineral / production process |
|---|---|---|
| violet (blue tone) | 903 | mineral : fluorine<br>rock : colourless<br>powder : colourless<br>origin : Ohio, United States<br><br>production process:<br>rock irradiated with electrons at 155,082 rad (light blue tone), then irradiated with gamma rays at 148.4 Mrad[144] |
| violet (blue tone) | 904 | mineral : fluorine<br>rock : very pale yellow, translucid<br>powder : white (light yellow reflection)<br>origin : Ohio, United States<br><br>production process:<br>(followed from «dark greyish brown [light violet tone]») 1 g of fluorine + 1 cc of white transparent synthetic enamel paint for the car / manual grinding / application on a piece of steel sheet for the body measuring 1" x 1" (greyish cream) / irradiated with gamma rays at 360 Mrad[127] |
| medium violet (blue tone) | 905 | mineral : fluorine<br>rock : pinkish lilac, opaque<br>powder : very light grey [lilac tone], almost white<br>origin : Saint-Lawrence Fluorspar Company, Saint-Lawrence, Newfoundland<br><br>mineral : sulphur<br>rock : brilliant yellow<br>powder : brilliant yellow<br>origin : unknown<br><br>production process:<br>2 g of fluorine + 2 g of sulphur / 1300 °F / 1 h (light beige [light pink tone and orange reflection]) / irradiated with gamma rays at 64.7 Mrad (followed at «very accentuated violet») |
| | | mineral : smaltite[25], variety of skutterudite<br>rock : dark iron-grey, with silver metallic brilliance |

| | | |
|---|---|---|
| dark violet (blue tone) | 906 | powder : dark grey<br>origin : Cobalt, Ontario<br><br><u>production process:</u><br>0↑1900 °F (dark brown): .30 g + 50 ml hydrochloric acid / soaking: 2 wk. / separation of the liquid and the solid / drying on hot plate (colour of the liquid: very intense peacock blue) / irradiated with gamma rays at 64.7 Mrad<br>(followed at «dark olive-green») |
| blue-violet (red tone) | | |
| blue-violet (red tone) ↓ | 907 | mineral : analcime<br>rock : white (grey reflection), crystalline and translucid<br>powder : light grey<br>origin : De-Mix quarry, North side of Mont Saint-Hilaire, Rouville county, Québec<br><br><u>production process:</u><br>(followed from «dark greyish green»)<br>2 g of analcime + 2 g of sodium carbonate:<br>0↑1800 °F + 1 h at 1800 °F |
| blue-violet (red tone) | 908 | 0↑1900 °F + 1 h at 1900 °F[145] |
| blue-violet (red tone) ↓ | 909 | <u>production process:</u><br>(followed from «dark greyish green»)<br>2 g of analcime + 2 g of potassium carbonate:<br>0↑1800 °F |
| blue-violet (red tone) | 910 | 0↑1900 °F |
| very saturated blue-violet (red tone) | 911 | mineral : fluorine<br>rock : very pale yellow, translucid<br>powder : white (light yellow reflection)<br>origin : Ohio, United States<br><br><u>production process:</u><br>(followed from «very pronounced reddish violet»)<br>rock irradiated with electrons at 164,800 rad (very intense peacock blue), then with gamma rays at 148.4 Mrad[146] |
| greyish blue-violet | | |

135

| | | |
|---|---|---|
| | | mineral : halite[41]<br>rock : colourless<br>powder : colourless<br>origin : Seleine Mine, Iles-de-la-Madeleine, Québec |
| blue-violet (grey reflection) | 912 | <u>production process:</u><br>(followed from «dark greyish blue or dark bluish grey»)<br>2 g of halite + 2 g of sodium carbonate / 0↑1100 °F + 1 h at 1100 °F (light grey) / irradiated with gamma rays at 424.7 Mrad |

BLUE (VIOLET TONE)

| colour obtained | number | mineral / production process |
|---|---|---|
| blue (mauve tone) | | |
| | | mineral : orpiment<br>rock : vivid yellow (orange tone)<br>powder : vivid yellow (orange tone)<br>origin : Nevada, United States<br><br>mineral : erythrite<br>rock : accentuated pink (lilac tone)<br>powder : light pink (lilac tone)<br>origin : Guatemala<br><br><u>production process:</u> |
| blue (mauve tone) | 912.1 | 1 g of orpiment + 1 g of erythrite / grinding / 450 °F / 10 min.[115] |
| | | mineral : erythrite<br>rock : accentuated pink (lilac tone)<br>powder : light pink (lilac tone)<br>origin : Guatemala<br><br>mineral : animal charcoal<br>powder : black<br>origin : Anachemia Chemicals Ltd., Montréal, Québec<br><br><u>production process:</u> |
| blue (mauve tone) | 912.2 | 1 g of erythrite + 1 g of animal charcoal / grindin / 450 °F / 10 min.[115] |
| | | mineral : erythrite<br>rock : accentuated pink (lilac tone)<br>powder : light pink (lilac tone)<br>origin : Guatemala<br><br>mineral : shale (Sillery formation)[547]<br>rock : medium brownish red (violet tone)<br>powder : light reddish brown (violet tone), mat<br>origin : cliff of Cap Rouge in the suburbs of Québec city, Québec<br><br><u>production process:</u> |
| blue (mauve tone) | 912.3 | 1 g of erythrite + 1 g of shale / grinding |

| | | |
|---|---|---|
| | | / 450 °F / 10 min.[115] |
| blue (mauve tone) | 912.4 | mineral : erythrite<br>rock : accentuated pink (lilac tone)<br>powder : light pink (lilac tone)<br>origin : Guatemala<br><br>mineral : zinc<br>powder : medium grey, with a metallic brilliance<br><br>production process:<br>1 g of erythrite + 1 g of zinc / grinding / 450 °F / 10 min.[115] |
| blue (mauve tone) | 912.5 | mineral : erythrite<br>rock : accentuated pink (lilac tone)<br>powder : light pink (lilac tone)<br>origin : Guatemala<br><br>mineral : ochre[111]<br>powder : dark reddish brown<br>origin : Red Mills in the suburbs of Cap-de-la-Madeleine, Québec<br><br>production process:<br>1 g of erythrite + 1 g of ochre / grinding / 450 °F / 10 min.[115] |
| blue (violet tone) | | |
| blue (violet tone) | 913 | mineral : copper<br>rock : reddish brown, with metallic brilliance<br>powder : reddish brown, with metallic brilliance<br>origin : unknown<br><br>production process:<br>(followed from «bluish turquoise lighter than "light bluish turquoise"»)<br>100 g of copper + 100 ml nitric acid / soaking: 5 mo. / natural drying (light bluish turquoise): 4 g + 20 ml ammonia / natural drying |
| | | mineral : fluorine<br>rock : very pale yellow, translucid<br>powder : white (light yellow reflection)<br>origin : Ohio, United States<br><br>mineral : sulphur<br>rock : brilliant yellow<br>powder : brilliant yellow<br>origin : unknown |

| | | |
|---|---|---|
| blue (violet tone) | 914 | <u>production process:</u><br>1 g of fluorine + 1 g of sulphur / 1700 °F / 1 h (very light grey) / irradiated with gamma rays at 65.65 Mrad<br>(followed at «brownish violet») |
| | | mineral : fluorine<br>rock : very pale yellow, translucid<br>powder : white (light yellow reflection)<br>origin : Ohio, United States<br><br><u>production process:</u><br>(followed from «dark lapis lazuli or dark ultramarine-blue»)<br>rock irradiated with gamma rays at: |
| blue (violet tone) ↓ | 915 | 5 Mrad[120] |
| | 916 | 5.7 Mrad |
| blue (violet tone) more intense than «blue (violet tone)» | 917 | 10 Mrad<br><br>(followed at «violet») |
| | | mineral : fluorine<br>rock : very light fluor-green (cold mint-green type), translucid<br>powder : very light grey<br>origin : Rogers Mine, Madoc, Ontario<br><br>mineral : sulphur<br>rock : brilliant yellow<br>powder : brilliant yellow<br>origin : unknown<br><br><u>production process:</u> |
| blue (violet tone) | 918 | 1 g of fluorine + 1 g of sulphur / 1700 °F / 1 h (very light grey) / irradiated with gamma rays at 65.65 Mrad<br>(followed at «brownish violet») |
| | 919 | mineral : sodalite<br>rock : indigo-blue slightly translucid<br>powder : light grey (light blue tone)<br>origin : possibly Africa<br><br><u>production process:</u><br>(followed from «indigo-blue more intense and darker than "indigo-blue"»)<br>rock irradiated with gamma rays at: |
| intense and profound blue (violet tone) ↓ | 920 | 424.7 Mrad |
| intense and profound blue (violet tone) | 921 | 482.984 Mrad |

| | | |
|---|---|---|
| very intense blue (violet tone) | 922 | production process: (followed at «indigo-blue ») 1500 °F / 1 h (light grey [beige tone]) / rock irradiated with gamma rays at 424.7 Mrad |
| very intense blue (violet tone) | 923 | mineral : barite<br>rock : pinkish white<br>powder : white<br>origin : Niobec Mine, Saint-Honoré, Saguenay, Québec<br>production process: 0↑2000 °F (light beige [yellow reflection]) / powder irradiated with gamma rays at 64.7 Mrad (followed at «medium beige [pink orange reflection]») |
| dark blue (violet tone) [«apple-green» areas] | 923.1 | mineral : erythrite<br>rock : accentuated pink (lilac tone)<br>powder : light pink (lilac tone)<br>origin : Guatemala<br>production process: 1 g of erythrite + 5 g of pyrex / manual grinding / heating: 5 °C per min. from 0↑1245 °C + maintenance durant 1 h / cooling: 5 °C per min. to ambient temperature / the entity in natural atmosphere |
| blue (violet tone) darker than «dark blue (violet tone) [with darker apple-green areas] | 923.2 | production process: 1 g of erythrite + 5 g of pyrex / manual grinding / heating: 5 °C per min. from 0↑1245 °C + maintenance during 1 h / cooling: 5 °C per min. until ambient temperature / the entity in natural atmosphere (dark blue [violet tone], with apple-green areas) / irradiation with gamma rays at 4.94 Mrad (followed at «grey [violet tone]») |
| dark blue (violet tone) | 924 | mineral : smaltite[25], variety of skutterudite<br>rock : dark iron-grey, with silver metallic brilliance<br>powder : dark grey<br>origin : Cobalt, Ontario<br>production process: 2 g of smaltite + 2.50 g of sodium carbonate / 1900 °F / 1 h[130] (followed at «dark greenish blue» and «dark grey, with dark royal-blue particles») |
| | | mineral : molybdenite[103]<br>rock : medium grey, with metallic brilliance<br>powder : medium grey, with metallic brilliance |

140

| | | |
|---|---|---|
| | | origin : Anglo American Molybdenite Mine, near Lamotte, Preissiac district, Abitibi, Québec<br><br>production process: |
| very dark and intense blue (violet reflection) | 925 | rock hermetically wrapped in bread dough / 1600 °F / 30 min. (blackish grey): rock of 10 g + 80 ml nitric acid / soaking: 1 wk. / deposited on hot plate / maintenance at boiling point until completely dry / colour of the liquid[149] |
| violet-blue (crimson tone) | | |
| | | mineral : halite[41]<br>rock : colourless<br>powder : colourless<br>origin : Seleine Mine, Iles-de-la-Madeleine, Québec<br><br>production process: |
| violet-blue (crimson tone) | 926 | powder sample placed for a period of 7 d. under irradiation, directly at the outlet of the primary beam of the X-ray generator [copper radiation, 20 mA current, 40 kV voltage[147,148]] (followed at «very dark brownish grey, almost black») |
| violet-blue (red tone) | | |
| | | mineral : fluorine<br>rock : reddish violet, translucid<br>powder : very light grey<br>origin : Ohio, United States<br><br>production process:<br>(followed from «reddish violet more blue than "reddish violet"») |
| violet-blue (light red tone) | 927 | rock irradiated with electrons at 305,200 rad[73,122] |

BLUE[151]

| colour obtained | number | mineral / production process |
|---|---|---|
| | | mineral : fluorine<br>rock : colourless<br>powder : colourless<br>origin : Ohio, United States<br><br><u>production process:</u><br>rock irradiated with gamma rays at: |
| very light blue | 928 | 5 Mrad |
| tone | 929 | 5.7 Mrad |
| \| | | |
| blue tone equivalent to the previous tone | 930 | 10 Mrad |
| ↓ | | |
| blue tone more accentuated | 931 | 57.4 Mrad[152]<br>(followed at «reddish violet») |
| | | <u>production process:</u> |
| light blue tone | 932 | rock irradiated with electrons at 155,082 rad |
| | | mineral : chalcocite<br>rock : dark iron-grey (with localized turquoise oxidation)<br>powder : dark iron-grey<br>origin : Butte, Montana, United States<br><br><u>production process:</u> |
| very light blue | 933 | 0↑1900 °F (dark iron-grey): 1 g + 50 ml sulphuric acid / soaking: 2 wk. / separation of the liquid and the solid / drying on hot plate / colour of the liquid[153] |
| | 934 | mineral : chrysocolla<br>rock : light greenish turquoise<br>powder : very light greenish turquoise<br>origin : Mexico<br><br><u>production process:</u> |
| very light blue | 935 | 2 g of chrysocolla + 20 ml phosphoric acid / soaking: 3 d. / drying on hot plate (still humid) |

| | | |
|---|---|---|
| | 936 | mineral : copper concentrate (Cu-FeS)<br>powder : medium chocolate-brown (grey tone)<br>origin : Centre de recherche des Mines Noranda in Montréal, Québec<br><br>production process: |
| light blue | 937 | 4 g of concentrate + 50 ml phosphoric acid / soaking: 4 wk. / drying on hot plate (still humid) / colour of the liquid[154] |
| | | mineral : malachite<br>rock : ribboned variety of accentuated mint-green<br>powder : light and brilliant mint-green<br>origin : Katanga province, at 300 km from Lubumbachai, Zaïr, Africa<br><br>production process: |
| light blue | 938 | 2 g of malachite + 20 ml phosphoric acid / soaking: 3 d. / drying on hot plate (still humid) |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed at «beige [light blue tone]») |
| blue [in between «light blue» and «light yellow»]<br>↓ | 939 | powder crushed and heated 0↑1000 °F (Naples yellow): .50 g + 15 ml nitric acid / soaking: 2 d. / slow drying on hot plate |
| light blue | 940 | powder crushed and heated 0↑1100 °F (Naples yellow [green tone]): .50 g + 15 ml nitric acid / soaking: 2 d. / slow drying on hot plate (followed at «yellow [light green tone]») |
| | | mineral : beryl<br>rock : light blue (near turquoise), slightly translucid<br>powder : light grey<br>origin : Lacorne district, Abitibi, Québec<br><br>production process:<br>rock irradiated with gamma rays at: |
| blue a little more accentuated than «light blue» | 941 | 5.7 Mrad[120] |

| | | |
|---|---|---|
| ↓<br>blue considerably more accentuated | 942 | 10 Mrad[159]<br>(followed at «light apple-green») |
| <br><br><br><br><br><br><br>blue more accentuated than «light blue»<br>↓<br>darker blue | <br><br><br><br><br><br><br>943<br><br><br><br>944 | mineral : beryl<br>rock : light blue, slightly translucid<br>powder : light grey<br>origin : Abitibi, Québec<br><br>production process:<br>rock irradiated with electrons at:<br>162,431 rad<br><br><br><br>302,831 rad[44] |
| <br><br><br><br><br><br><br>pastel blue (with a «light iridescent verdigris» layer of powder on the surface) | <br><br><br><br><br><br><br>945 | mineral : smaltite[25], variety of skutterudite<br>rock : dark iron-grey, with silver metallic brilliance<br>powder : dark grey<br>origin : Cobalt, Ontario<br><br>production process:<br>0↑1900 °F (dark brown): .60 g + 100 ml hydrochloric acid / soaking: 4 years / drying on hot plate[155] |
| <br><br><br><br><br><br>blue | <br><br><br><br><br><br>946 | mineral : chrysocolla<br>rock : light greenish turquoise<br>powder : very light greenish turquoise<br>origin : Mexico<br><br>production process:<br>2 g of chrysocolla + 25 ml nitric acid / separation of the liquid and the solid / natural drying / colour of the liquid[156] |
| <br><br><br><br><br><br><br>blue | <br><br><br><br><br><br><br>947 | mineral : fluorine<br>rock : very light fluor-green (cold mint-green type), translucid<br>powder : very clear grey<br>origin : Rogers Mine, Madoc, Ontario<br><br>production process:<br>1500 °F / 1 h (white, semi-opaque [pink-orange reflection]) / rock irradiated with gamma rays at 64.7 Mrad[120]<br>(followed at «indigo-blue») |

| | | |
|---|---|---|
| blue | 948 | production process:<br>rock irradiated with electrons at 164,800 rad (bluish green more intense than «very light bluish green»), then at 155,082 rad (bluish green still more intense), then at 140,400 rad[158] |
| cold blue | 949 | production process:<br>rock irradiated with electrons at 155,082 rad (followed at «greenish blue more intense than "very light greenish blue"») |
| blue | 950 | mineral : microcline<br>rock : white (grey reflection)<br>powder : white (grey reflection)<br>origin : Buckingham, Québec<br><br>production process:<br>(followed from «light bluish green»)<br>2 g of microcline + 2 g of sodium carbonate / 0↑1600 °F + 1 h at1600 °F[157]<br>(followed at «greenish blue») |
| blue | 951 | mineral : siderite<br>rock : caramel–brown (grey tone)<br>powder : light beige (orange tone)<br>origin : De-Mix quarry, North side of Mont Saint-Hilaire, Rouville county, Québec<br><br>production process:<br>2 g of siderite + 2 g of sodium carbonate / 0↑1600 °F + 1 h at1600 °F (light greenish blue) / irradiated with gamma rays at 64.7 Mrad (followed at «dark grass-green [brownish tone]») |
| blue | 952 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>0↑1900 °F (light grey [beige tone]): .50 g + 80 ml phosphoric acid / soaking: 2 wk. / drying on hot plate (still humid) / colour of the liquid[7] |
| | | mineral : ochre[20]<br>powder : orange<br>origin : small copper and nickel deposit, in |

145

| | | |
|---|---|---|
| | | the South-Western area of a mass of serpentinite at 3 km at the West of Saint-Fabien-de-Panet, Québec |
| | | production process: |
| | | 2 g of ochre + 2 g of sodium carbonate: |
| blue | 953 | 0↑1500 °F + 1 h at 1500 °F |
| of various tones | 954 | 0↑1600 °F + 1 h at 1600 °F |
| ↓ | 955 | 0↑1700 °F + 1 h at 1700 °F |
| | 956 | 0↑1800 °F + 1 h at 1800 °F |
| | 957 | 0↑1900 °F + 1 h at 1900 °F |
| | 958 | mineral : real cerulean blue[151] |
| | | powder : vivid blue |
| | | origin : Sennelier, Paris, France |
| | | production process: |
| blue lighter and more vivid than «vivid blue» | 959 | irradiated with electrons at 305,200 rad[73] |
| | | mineral : spodumene |
| | | rock : pale green |
| | | powder : light grey, almost white |
| | | origin : Québec Lithium Co., Baraute, Abitibi, Québec |
| | | production process: |
| intense blue | 960 | 2 g of spodumene + 2 g of sodium carbonate / 0↑1700 °F + 1 h at 1700 °F (emerald-green more intense than «light emerald-green») / irradiated with electrons at 162,431 rad[161] |
| | | mineral : yofortierite[87] |
| | | rock : dark chocolate-brown (with pinkish brown areas) |
| | | powder : dark chocolate-brown |
| | | origin : De-Mix quarry, North side of Mont Saint-Hilaire, Rouville county, Québec |
| | | production process: |
| intense blue ↓ | 961 | 1 g of yofortierite + 50 ml sulphuric acid / soaking: 2 wk. / separation of the liquid and the solid / drying on hot plate / colour of the liquid |
| intense blue | 962 | 1 g of yofortierite + 50 ml sulphuric acid / soaking: 2 wk. / separation of the liquid and the solid / drying on hot plate / colour of the solid |

| | | |
|---|---|---|
| intense blue | 963 | mineral : malachite<br>rock : ribboned variety of accentuated mint-green<br>powder : light and brilliant mint-green<br>origin : Katanga province, at 300 km from Lubumbachai, Zaïr, Africa<br><br>production process:<br>2 g of malachite + 25 ml nitric acid / natural drying |
| | | mineral : real cerulean blue[151]<br>powder : vivid blue<br>origin : Sennelier, Paris, France<br><br>production process:<br>irradiated with gamma rays at: |
| blue more intense than «vivid blue» ↓ | 964 | 122.984 Mrad[509] |
| blue still more intense and darker | 965 | 482.984 Mrad |
| very intense blue | 966 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>3 g of molybdenite powder finely crus hed + 30 ml nitric acid / soaking: 3 d. / drying on hot plate[143] |
| very intense blue | 967 | production process:<br>(followed from «very intense greenish blue»)<br>molybdenite at the state of powder crushed and heated 0↑1100 °F (Naples yellow [green tone]): .50 g + 15 ml hydrochloric acid[145] / soaking: 2 d. / slow drying on hot plate |
| very intense blue | 968 | molybdenite at the state of powder crushed and heated 0↑1200 °F (Naples yellow ): .50 g + 15 ml hydrochloric acid / soaking: 2 d. / slow drying on hot plate |
| ↓ very intense blue | 969 | molybdenite at the state of powder crushed and |

147

| | | |
|---|---|---|
| | | heated 0↑1300 °F (yellow more accentuated than «light yellow»): .50 g + 15 ml hydrochloric acid / soaking: 2 d. / slow drying on hot plate |
| | | <u>production process:</u> |
| very intense blue | 970 | molybdenite crushed at the state of powder and heated 0↑900 °F (beige): .50 g + 15 ml sulphuric acid / soaking: 2 d. / slow drying on hot plate |
| ↓ | | (followed at «very intense greenish blue») |
| ↓ | | (followed at «very intense greenish blue») |
| very intense blue | 971 | molybdenite crushed at the state of powder and heated 0↑1100 °F (Naples yellow [green tone]): .50 g + 15 ml sulphuric acid / soaking: 2 d. / slow drying on hot plate |
| very intense blue | 972 | molybdenite crushed at the state of powder and heated 0↑1200 °F (Naples yellow): .50 g + 15 ml sulphuric acid / soaking: 2 d. / slow drying on hot plate |
| ↓ | | |
| very intense blue | 973 | molybdenite crushed at the state of powder and heated 0↑1300 °F (yellow more accentuated than «light yellow»): .50 g + 15 ml sulphuric acid / soaking: 2 d. / slow drying on hot plate |
| | | <u>production process:</u> |
| very intense blue | 974 | rock heated 0↑1400 °F + 6 h at 1400 °F / removal of crystals formed at the surface of the rock (colour of the crystals: light yellow): .30 g of crystals + 25 ml nitric acid / soaking: 2 d. / slow drying on hot plate |
| very intense blue | 975 | rock heated 0↑1400 °F + 6 h at 1400 °F / removal of crystals formed at the surface of the rock (colour of the crystals: light yellow): .30 g of crystals + 20 ml nitric acid + 45 ml hydrochloric acid / soaking: 2 d. / drying on hot plate |
| very intense blue | 976 | rock heated 0↑1400 °F + 6 h at 1400 °F / removal of crystals formed at the surface of the rock (colour of the crystals: light yellow): .30 g of crystals + 15 ml nitric acid + 10 ml hydrochloric acid / soaking: 2 d. / drying on hot plate |
| very intense blue | 977 | rock heated 0↑1400 °F + 6 h at 1400 °F / removal |

148

| | | |
|---|---|---|
| ↓ | | of crystals formed at the surface of the rock (colour of the crystals: light yellow): .30 g of crystals + 10 ml nitric acid + 15 ml hydrochloric acid / soaking: 2 d. / drying on hot plate |
| very intense blue | 978 | rock heated 0↑1400 °F + 6 h at 1400 °F / removal of crystals formed at the surface of the rock (colour of the crystals: light yellow): .30 g of crystals + 5 ml nitric acid + 20 ml hydrochloric acid / soaking: 2 d. / drying on hot plate |
| very intense blue | 979 | production process:<br>rock hermetically wrapped in bread dough / 1600 °F / 30 min.[166] / cooling (blackish grey) / the rock is crus hed: 2 g of powder + 100 ml nitric acid / soaking: 1 wk. / deposit on hot plate / brought to boiling point; then, slow drying on hot plate |
| very intense blue | 980 | production process:<br>rock entirely covered with 20 ml nitric acid / soaking: 3 d. / drying on hot plate |
| very saturated and vivid blue | 981 | mineral : bornite<br>rock : reddish brown (with localized green and bluish green oxidation)<br>powder : reddish brown<br>origin : Lac Musset, Fosse du Labrador, Québec<br><br>production process:<br>(followed from «very intense and saturated greenish blue»)<br>12 g of bornite + 40 ml nitric acid / soaking: 3 h / separation of the 1st liquid and the solid / addition to the same solid of 40 ml nitric acid / soaking: 1 d. / separation of the 2nd liquid and the solid / resting of the 2nd liquid during 5 d. / drying on sand bath / colour of the 2nd liquid[167]<br>(followed at «mat and medium greenish turquoise») |
| | | mineral : spodumene<br>rock : pale green<br>powder : light grey, almost white<br>origin : Québec Lithium Co., Baraute, Abitibi, Québec<br><br>production process:<br>(followed from «emerald-green more intense than "light emerald-green "») |

| | | |
|---|---|---|
| profound and intense blue | 982 | 2 g of spodumene + 2 g of sodium carbonate / 1700 °F / 1 h |
| blue considerably more intense than «very intense blue» | 983 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>3 g of molybdenite finely crushed + 30 ml nitric acid / soaking: 3 d. / drying on hot plate (very intense blue) / irradiated with gamma rays at 64.7 Mrad[164]<br>(followed at «indigo-blue considerably more intense than "very intense blue"») |
| dark blue [with a dark grey area] | 984 | mineral : smaltite[25], variety of skutterudite<br>rock : dark iron-grey, with silver metallic brilliance<br>powder : dark grey<br>origin : Cobalt, Ontario<br><br>production process:<br>(followed from «medium iron-grey»)<br>1 g of smaltite + 1.50 g of sodium carbonate / 1800 °F / 1 h[168,1197]<br>(followed at «dark grey [with "dark royal-blue particles"]») |
| very dark and saturated blue [almost black] | 985 | mineral : fluorine<br>rock : very light fluor-green (cold mint-green type), translucid<br>powder : very light grey<br>origin : Rogers Mine, Madoc, Ontario<br><br>production process:<br>rock irradiated with electrons at 155,082 rad (cold blue), then with gamma rays at 360 Mrad[169] |
| mixture of particles | | |
| light blue / light beige | 986 | mineral : beryl<br>rock : light blue, slightly translucid<br>powder : light grey<br>origin : Abitibi, Québec<br><br>production process:<br>2 g of beryl + 20 ml hydrofluoric acid / soaking: 24 h / drying in a drying oven at 100 °F |

| | | |
|---|---|---|
| | | mineral : barite<br>rock : pinkish white<br><br>powder : white<br>origin : Niobec Mine, Saint-Honoré, Saguenay, Québec<br><br>production process: |
| blue / pink (lilac tone) | 987 | 0↑1900 °F (greyish beige [pink reflection]) / irradiated with gamma rays at 64.7 Mrad[209,577] (followed at «dark brownish beige [grey tone]») |
| blue / light pink | 988 | production process:<br>1700 °F (cream) / powder irradiated with gamma rays at 64.7 Mrad («medium greyish beige [orange tone]») |
| blue / black | 989 | production process:<br>0↑1900 °F (greyish beige [pink reflection]): .30 g + 50 ml phosphoric acid / soaking: 2 wk. / drying on hot plate (still humid) / colour of the liquid[160] |
| | | mineral : chalcocite<br>rock : dark iron-grey (with localized turquoise oxidation)<br>powder : dark iron-grey<br>origin : Butte, Montana, United States<br><br>production process: |
| very vivid blue / acute greenish turquoise | 990 | 4 g of chalcocite + 100 ml nitric acid / soaking: 2 wk. / separation of the liquid (1st) and the solid / desiccation of the 1st liquid (colour of the 1st liquid: very intense emerald-green) / addition to the same solid of 100 ml nitric acid / soaking: 2 wk. / separation of the 2nd liquid and the solid / natural drying of the solid (colour of the solid: intense green [in between «grass-green» and «Paris green»]) / desiccation of the 2nd liquid / colour of the 2nd liquid[162,257] |
| indigo-blue | | |
| | | mineral : fluorine<br>rock : very light fluor-green (cold mint-green type), translucid<br>powder : very light grey<br>origin : Rogers Mine, Madoc, Ontario<br><br>production process:<br>(followed from «blue») |
| indigo-blue | 991 | 1500 °F / 1 h (white, semi-opaque [pink orange reflection]) / rock irradiated with gamma rays |

151

| | | |
|---|---|---|
| | | at 424.7 Mrad[120] |
| indigo-blue | 992 | mineral : sodalite<br>rock : indigo-blue, slightly translucid<br>powder : light grey (light blue tone)<br>origin : possibly Africa<br><br>production process:<br>1500 °F / 1 h (light grey [beige]) / rock irradiated with gamma rays at 64.7 Mrad<br>(followed at «very intense blue [violet tone]») |
| watering: indigo-blue / light grey / light pinkish brown / medium pinkish brown | 992.1 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>1 g of serandite + 5 g of pyrex / manual grinding / heating: 5 °C per min. 0 °C to 1245 °C + maintenance during 1 h / cooling: 5 °C per min. to the ambient temperature / the enterity in the natural atmosphere |
| | | mineral : sodalite<br>rock : indigo-blue, slightly translucid<br>powder : light grey (light blue tone)<br>origin : possibly Africa<br><br>production process:<br>rock irradiated with gamma rays[170] at: |
| indigo-blue darker and more intense than «indigo-blue» | 993 | 5 Mrad[120] |
| \| | 994 | 5.7 Mrad |
| which evolves to | 995 | 10 Mrad |
| \| | 996 | 57.4 Mrad |
| indigo-blue still more profound | 997 | 63.984 Mrad |
| \| | 998 | 102.4 Mrad |
| indigo-blue still very strongly accentuated | 999 | 122.984 Mrad[133] |
| \| which | 1000 | 148.4 Mrad |
| \| goes | 1001 | 201.6 Mrad |
| \| to | 1002 | 247.6 Mrad |
| ↓ | 1003 | 287.3 Mrad |
| indigo-blue more | 1004 | 360 Mrad |

152

| | | |
|---|---|---|
| dark and intense | | (followed at «blue [violet tone] intense and profound») |
| indigo-blue more intense and darker than «indigo-blue» | 1005 | production process:<br>rock sample placed for a period of 7 d. under irradiation, directly at the outlet of the primary beam of an X-ray generator (copper radiation, 20 mA, 40 kV) |
| intense indigo-blue | 1006 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>2 g of malachite + 20 ml sulphuric acid / natural drying |
| indigo-blue considerably more intense than «very intense indigo-blue» | 1007 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «blue considerably more intense than "blue, very intense"»)<br>3 g of molybdenite crushed finely + 30 ml nitric acid / soaking: 3 d. / drying on hot plate (very intense blue) / irradiated with gamma rays at 424.7 Mrad[172] |
| dark indigo-blue | 1007.1 | production process:<br>molybdenite crushed finely and heated 0↑1100 °F (Naples yellow [green tone]): .50 g + 15 ml sulphuric acid / soaking: 2 d. / slow drying on hot plate (very intense blue): .15 g + 6 cc of polymer used for concrete + 0.18 cc of catalyst + 1.50 thousandth of a g of cobalt 6% / manual grinding and mixing / moulding / hardening (Prussian-blue type or intense indigo-blue) / irradiation with gamma rays at 18.85 Mrad |
| | 1008 | mineral : beryl<br>rock : intense grass-green, slightly translucid<br>powder : greenish grey<br>origin : unknown |

| | | |
|---|---|---|
| dark blue (indigo type) | 1009 | production process:<br>3 g of beryl + 40 ml sulphuric acid / soaking: 18 d. / separation of the liquid and the solid / drying on hot plate (colour of the liquid: very, very light grey, almost white [with a few «cobalt-blue» particles]) / irradiated with gamma rays at 65.65 Mrad[171] / colour of the «cobalt-blue» particles<br>(followed at «beige» and «medium beige») |
| | 1010 | mineral : sodalite<br>rock : cold light blue<br>powder : light grey (light blue tone)<br>origin : Bancroft, Ontario<br><br>production process:<br>(followed from «light bluish green»)<br>2 g of sodalite + 2 g of sodium carbonate / |
| dark indigo-blue | 1011 | 0↑1500 °F + 1 h at 1500 °F |
| ↓ | | |
| dark indigo-blue | 1012 | 0↑1600 °F + 1 h at 1600 °F<br>(followed at «greyish blue») |
| | | mineral : fluorine<br>rock : very pale yellow, translucid<br>powder : white (light yellow reflection)<br>origin : Ohio, United States<br><br>production process: |
| dark indigo-blue | 1012.1 | rock heated at 150 °F / 2 h / cooling in ambient air / irradiation with gamma rays at 2.26 Mrad |
| dark indigo-blue | 1012.2 | production process:<br>rock hermetically wrapped in bread dough / 150 °F / 2 h / cooling in ambient air / irradiation with gamma rays at 2.26 Mrad |
| very dark indigo-blue | 1012.3 | production process:<br>rock hermetically wrapped in bread dough / 150 °F / 2 h / immediately deposited at -20 °C during 2 h / irradiation with gamma rays at 2.26 Mrad |
| | | mineral : fluorine<br>rock : very pale yellow, translucid<br>powder : white (light yellow reflection)<br>origin : Ohio, United States<br><br>mineral : cement[1138]<br>powder : white |

| | | |
|---|---|---|
| very dark indigo-blue | 1013 | <u>production process:</u><br>(followed from «dark violet»)<br>5 g of rocks of various sizes + 13.74 g of white cement[1138] + 6.50 cc of water / manual mixing / moulding / hardening / 0↑1900 °F / cooling / irradiation wiht gamma rays at 18.85 Mrad / colour of the rocks[173] |
| indigo-blue more accentuated and darker than «very dark indigo-blue» | 1013.1 | vegetable : indigo<br>powder : very dark indigo-blue<br><br><u>production process:</u><br>irradiated with gamma rays at 2.26 Mrad |
| indigo-blue (grey tone) | | |
| very dark and cold indigo-blue (light grey tone) | 1013.2 | mineral : fluorine<br>rock : very pale yellow, translucid<br>powder : white (light yellow reflection)<br>origin : Ohio, United States<br><br><u>production process:</u><br>rock hermetically wrapped in bread dough / 150 °F / 2 h / inserted in mineral wool and irradiated while hot with gamma rays at 2.26 Mrad[1268] |
| cobalt-blue[173a] | | |
| | 1014 | mineral : obsidian<br>rock : light cobalt-blue[173a]<br>origin : zone of Grand Rapids, on Matagami river, at the embouchure of Adams Creek, Ontario |
| cobalt-blue darker than «light cobalt-blue» | 1015 | <u>production process:</u><br>rock irradiated with gamma rays at 55 Mrad |
| | | mineral : fluorine<br>rock : very light fluor-green (cold mint-green type), slightly translucid<br>powder : very light grey<br>origin : Rogers Mine, Madoc, Ontario<br><br>mineral : cement[1138]<br>powder : white |

| | | |
|---|---|---|
| cobalt-blue | 1016 | production process:<br>5 g of rocks of various sizes + 13.74 g of white cement[1138] + 6.50 cc of water / manual mixing / moulding / hardening / irradiated with gamma rays at 18.85 Mrad / colour of the rocks (followed at «intense peacock-blue [light grey tone]») |
| | | mineral : fluorine<br>rock : colourless<br>powder : colourless<br>origin : Ohio, United States |
| medium and pronounced cobalt-blue | 1017 | production process:<br>rock irradiated with electrons at 305,200 rad[73,119,1233] |
| | 1018 | mineral : obsidian<br>rock : medium cobalt-blue[173a]<br>origin : zone of Grand Rapids, on Matagami river, at the embouchure of Adams Creek, Ontario |
| cobalt-blue darker than «medium cobalt-blue» | 1019 | production process:<br>rock irradiated with gamma rays at 55 Mrad |
| | | mineral : fluorine<br>rock : very pale yellow, translucid<br>powder : white (light yellow reflection)<br>origin : Ohio, United States |
| very strong, very intense cobalt-blue | 1020 | production process:<br>(followed from «very intense peacock-blue»)<br>rock irradiated with electrons at 305,200 rad[73] |
| | | mineral : smaltite[25] (variety of skutterudite)<br>rock : dark iron-grey, with silver metallic brilliance<br>powder : dark grey<br>origin : Cobalt, Ontario |
| intense and dark cobalt-blue | 1020.1 | production process:<br>1 g of smaltite + 6.50 g of glass powder (spruce pine batch) / manual grinding / deposited on a ceramic plate at the state of a biscuit / heated in a furnace 0↑1000 °C in a normal atmosphere / slow cooling in the furnace |

| | | |
|---|---|---|
| cobalt-blue a little darker than «intense and dark cobalt-blue» | 1020.2 | <u>production process:</u> 1 g of smaltite + 6.50 g of glass powder (spruce pine batch) / manual grinding / deposited on a ceramic plate at the state of a biscuit / heated in a furnace 0↑1000 °C in ambient air / slow cooling in furnace (intense and dark cobalt-blue) / irradiation with gamma rays at 2.47 Mrad |
| azurite-blue | | |
| | 1021 | mineral : azurite<br>rock : dark and intense azurite-blue[24]<br>origin : Morocco<br><br><u>production process:</u><br>crystals irradiated with gamma rays at: |
| azurite-blue a little more pale than «dark and intense azurite-blue»<br>↓ | 1022 | 122.984 Mrad[174] |
| darker azurite-blue (near the «indigo-blue») | 1023 | 482.984 Mrad[175] |
| Prussian-blue | | |
| | | mineral : fluorine<br>rock : very pale yellow, translucid<br>powder : white (light yellow reflection)<br>origin : Ohio, United States<br><br><u>production process:</u> |
| dark Prussian-blue | 1023.1 | rock heated at 150 °F / 2 h / inserted in mineral wool and irradiated while hot with gamma rays at 2.26 Mrad[1268] |
| lapis lazuli or ultramarine-blue | | |
| | | mineral : chrysocolla<br>rock : light greenish turquoise<br>powder : very light greenish turquoise<br>origin : Mexico<br><br><u>production process:</u> |
| lapis lazuli or ultramarine-blue | 1024 | 2 g of chrysocolla + 20 ml ammonia[177] / natural drying |
| | | mineral : fluorine<br>rock : white (pinkish reflection), |

157

| | | |
|---|---|---|
| | | translucid<br>powder : white (grey reflection)<br>origin : Saint-Lawrence Fluorspar Company, Saint-Lawrence, Newfounland<br><br>mineral : cement[1138]<br>powder : white<br><br>production process:<br>(followed from «dark iron-grey [brown reflection]»)<br>5 g of rocks of various sizes + 13.74 g of white cement[1138] + 6.50 cc of water / manual mixing / moulding / hardening / 0†2000 °F / cooling / irradiated with gamma rays at 18.85 Mrad[178] |
| lapis lazuli or ultramarine-blue | 1025 | |
| | | mineral : smaltite[25], variety of skutterudite<br>rock : dark iron-grey, with silver metallic brilliance<br>powder : dark grey<br>origin : Cobalt, Ontario<br><br>production process:<br>1 g of smaltite + 2.50 g of sodium carbonate / 1800 °F / 1 h (intense, dark and brilliant royal-blue) / irradiated with gamma rays at 64.7 Mrad[179] |
| intense lapis lazuli or ultramarine-blue | 1026 | |
| | | mineral : fluorine<br>rock : very pale yellow, translucid<br>powder : white (light yellow reflection)<br>origin : Ohio, United States<br><br>production process:<br>rock irradiated with gamma rays at 2.26 Mrad<br><br>(followed at «blue [violet tone]») |
| dark lapis lazuli or ultramarine-blue | 1026.1 | |
| | | mineral : lapis lazuli<br>rock : dark ultramarine-blue[141a]<br>origin : Afghanistan<br><br>production process:<br>irradiated with gamma rays at 55 Mrad |
| lapis lazuli or ultramarine-blue darker than «dark lapis lazuli or dark ultramarine-blue» | 1027 | |
| lapis lazuli (violet tone) or ultramarine-blue (violet tone) | | |
| | | mineral : fluorine |

158

| | | |
|---|---|---|
| dark lapis lazuli (light violet tone) or dark ultramarine-blue (light violet tone) | 1027.a | rock : very pale yellow, translucid<br>powder : white (light yellow reflection)<br>origin : Ohio, United States<br>production process:<br>rock cooled at -20 °C during 2 h / immediately irradiated with gamma rays at 2.26 Mrad |
| dark lapis lazuli (light violet tone) or dark ultramarine-blue (light violet tone) | 1027.b | production process:<br>rock hermetically wrapped in bread dough / deposited at -20 °C during 2 h / immediately irradiated with gamma rays at 2.26 Mrad |
| dark lapis lazuli (light violet tone) or dark ultramarine-blue (light violet tone) | 1027.c | production process:<br>rock heated at 150 °F / 2 h / deposited immediately at -20 °C during 2 h / immediately irradiated with gamma rays at 2.26 Mrad |
| la pis lazuli or ultramarine-blue (red tone) | | |
| lapis lazuli or ultramarine-blue (red reflection) much darker than «dark lapis lazuli or dark ultramarine-blue (red reflection)» | 1027.1a | mineral : smaltite[25], variety of skutterudite<br>rock : dark iron-grey, with silver metallic brilliance<br>powder : dark grey<br>origin : Cobalt, Ontario<br>production process:<br>1 g of smaltite + 5 g of pyrex / manual grinding / heated: 5 °C per min. from 0↑1245 °C + maintenance during 1 h / cooling: 5 °C per min. to ambient air / the entirety in ambient air (dark ultramarine-blue [grey tone]) / irradiation with gamma rays at 4.94 Mrad<br><br>(followed at «black [light blue reflection]») |
| lapis lazuli or ultramarine-blue (grey tone) | | |
| dark lapis lazuli (grey tone) or ultramarine-blue (grey tone) | 1027.1b | mineral : smaltite[25], variety of skutterudite<br>rock : dark iron-grey, with silver metallic brilliance<br>powder : dark grey<br>origin : Cobalt, Ontario<br>production process:<br>1 g of smaltite + 5 g of pyrex / manual grinding / heated: 5 °C per min. 0↑1245 °C + maintenance during 1 h / cooling: 5 °C per min. to ambient air / the entirety in ambient air |

159

| azure-blue | | |
|---|---|---|
| pale azure-blue | 1027.2 | mineral : copper<br>rock : reddish brown, with metallic luster<br>powder : reddish brown, with metallic luster<br>origin : unknown<br><br><u>production process:</u><br>rock entirely covered with 1000 ml acetic acid / natural drying / removal of crystals formed at the surface of the rock (the colour of the crystals: pronounced emerald-green): 4 g + 20 ml ammonia / natural drying |
| very light azure-blue | 1028 | mineral : beryl<br>rock : light blue, slightly translucid<br>powder : light grey<br>origin : Abitibi, Québec<br><br><u>production process:</u><br>(followed from «light grey»)<br>2 g of beryl + 2 g of sodium carbonate / 0↑1500 °F + 1 h at 1500 °F<br>(followed at «light bluish turquoise») |
| very light azure-blue | 1029 | mineral : beryl<br>rock : light blue (near bluish turquoise, slightly translucid)<br>powder : light grey<br>origin : Lacorne district, Abitibi, Québec<br><br><u>production process:</u><br>2 g of beryl + 2 g of potassium carbonate / 0↑1500 °F<br>(followed at «light bluish turquoise») |
| very light azure-blue | 1030 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>4 g of wilsonite + 1 g of potassium carbonate / 0↑1500 °F<br>(followed at «light grey») |
| | | mineral : amethyst<br>rock : violet, translucid |

| | | |
|---|---|---|
| azure-blue much lighter than «light azure-blue» | 1031 | powder : light grey (lilac tone)<br>origin : Thunderbay, Ontario<br><br>production process:<br>2 g of amethyst + 2 g of sodium carbonate / 0↑1800 °F + 1 h at 1800 °F (azure-blue) / irradiated with electrons at 162,431 rad (followed at «very light bluish turquoise, almost white») |
| | | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>1 g of analcime + 2 g of potassium carbonate: |
| light azure-blue | 1032 | 0↑1500 °F |
| ↓ | | |
| pale and whitened azure-blue | 1033 | 0↑1600 °F |
| ↓ | | |
| whitens and becomes more pale | 1034 | 0↑1700 °F |
| | 1035 | 0↑1800 °F |
| light azure-blue | 1036 | mineral : andulusite<br>rock : light brownish grey<br>powder : light grey<br>origin : Bimbowrie, South Australia<br><br>production process:<br>irradiated with gamma rays at 65 Mrad: .81 g + 1.31 g of sodium carbonate / 1700 °F / 1 h[180] |
| light azure-blue | 1037 | mineral : beryl<br>rock : light blue (near turquoise), slightly translucid<br>powder : light grey<br>origin : Lacorne district, Abitibi, Québec<br><br>production process:<br>1 g of beryl + 1 g of sodium carbonate / 1600 °F / 1 h<br>(followed at «light bluish turquoise») |
| | 1038 | mineral : beryl<br>rock : very light greenish blue, slightly translucid<br>origin : Brassard district, Berthier county |

161

| | | |
|---|---|---|
| | | Québec |
| light azure-blue | 1039 | production process:<br>rock hermetically wrapped in bread dough / 1600 °F / 30 min.[181] |
| light azure-blue | 1040 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml sulphuric acid / soaking: 2 wk. / separation of the liquid and the solid / drying on hot plate (colour of the liquid: light and intense mint-green) / irradiated with electrons at 162,431 rad |
| light azure-blue | 1041 | mineral : bornite<br>rock : reddish brown (with localized green and bluish green oxidation)<br>powder : reddish brown<br>origin : Lac Musset, Fosse du Labrador, Québec<br><br>production process:<br>1500 °F / 1 h (medium reddish brown): 1 g + 40 ml sulphuric acid / soaking: 14 d.[182] / drying on hot plate |
| light azure-blue | 1042 | production process:<br>1 g of bornite + 10 ml nitric acid / soaking: 6 d. / separation of the liquid and the solid / natural drying / colour of the liquid[24,183] (followed at «medium apple-green [grey tone]» and «pronounced greenish turquoise») |
| light azure-blue<br>↓ | 1043 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «green [in between "olive-green" and "phtalo-green"[202a]]»)<br>2 g of molybdenite + 2 g of sodium carbonate:<br>0↑1800 °F + 1 h at 1800 °F |
| more intense azure-blue | 1044 | 0↑1900 °F + 1 h at 1900 °F |

| | | |
|---|---|---|
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>2 g of wilsonite + 1 g of potassium carbonate: |
| very light azure-blue | 1045 | 0↑1500 °F |
| ↓ | | |
| light azure-blue | 1046 | 0↑1600 °F[185]<br>(followed at «very light grey») |
| | | production process:<br>(followed from «light grey») |
| light azure-blue | 1047 | 1 g of wilsonite + .50 g of sodium carbonate / 1600 °F / 1 h |
| ↓ | | |
| azure-blue more intense than «light azure-blue» | 1048 | 1 g of wilsonite + 1 g of sodium carbonate / 1600 °F / 1 h<br>(followed at «greenish blue») |
| | | mineral : bornite<br>rock : reddish brown (with localized green and bluish green oxidation)<br>powder : reddishg brown<br>origin : Lac Musset, Fosse du Labrador, Québec<br><br>production process:<br>(followed from «intense bluish turquoise» and «mixture of particles: dark greenish turquoise / dark olive-green») |
| light and very vivid azure-blue | 1049 | 1 g of bornite + 40 ml hydrochloric acid / soaking: 6 d. / separation of the liquid and the solid / natural drying / colour of the liquid[186]<br>(followed at «light and acute phtalo-green» and «very, very acute lime-green [yellow tone]») |
| | | production process:<br>(followed from «pale phtalo-green») |
| light and very vivid azure-blue | 1050 | 1 g of bornite + 40 ml nitric acid / soaking: 6 d. / separation of the liquid and the solid / natural drying / colour of the liquid[24]<br>(followed at «light and acute phtalo-green» and «intense and dark phtalo-green») |
| | | mineral : copper<br>rock : reddish brown, with metallic luster<br>powder : reddish brown, with metallic luster<br>origin : unknown |

| | | |
|---|---|---|
| azure-blue | 1050.1 | production process:<br>100 g of copper + 100 ml nitric acid / soaking: 5 mo. / natural drying (light bluish turquoise): 4 g + 20 ml ether / natural drying |
| | | mineral : amethyst<br>rock : violet, translucid<br>powder : light grey (lilac tone)<br>origin : Thunderbay, Ontario<br><br>production process:<br>(followed from «dark creamy beige»)<br>2 g of amethyst + 2 g of sodium carbonate: |
| azure-blue | 1051 | 0↑1600 °F + 1 h at 1600 °F |
| \| | | |
| azure-blue | 1052 | 0↑1700 °F + 1 h at 1700 °F |
| \| | | |
| azure-blue | 1053 | 0↑1800 °F + 1 h at 1800 °F |
| ↓ | | |
| azure-blue lighter than «azure-blue» | 1054 | 0↑1900 °F + 1 h at 1900 °F |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «accentuated light green»)<br>2 g of wilsonite + 2 g of sodium carbonate: |
| azure-blue | 1055 | 0↑1600 °F + 1 h at 1600 °F |
| \| | | |
| azure-blue more intense than «azure-blue» | 1056 | 0↑1700 °F + 1 h at 1700 °F |
| \| | | |
| azure-blue still more intense | 1057 | 0↑1800 °F + 1 h at 1800 °F |
| ↓ | | |
| azure-blue still more intense | 1058 | 0↑1900 °F + 1 h at 1900 °F |
| | | production process:<br>2 g of wilsonite + 2 g of sodium carbonate: |
| azure-blue | 1059 | 0↑1600 °F + 2 h at 1600 °F[190] |
| \| | | |
| azure-blue more intense than | 1060 | 0↑1600 °F + 3 h at 1600 °F |

| | | |
|---|---|---|
| «azure-blue» | | |
| ↓ | | |
| azure-blue still more intense | 1061 | 0↑1600 °F + 4 h at 1600 °F |
| ↓ | | |
| azure-blue still more intense | 1062 | 0↑1600 °F + 6 h at 1600 °F |
| ↓ | | |
| azure-blue still more intense | 1063 | 0↑1600 °F + 8 h at 1600 °F |
| | | production process:<br>2 g of wilsonite + 3 g of potassium carbonate: |
| very light azure-blue | 1064 | 0↑1500 °F[188] |
| ↓ | | |
| medium azure-blue | 1065 | 0↑1600 °F[189] |
| ↓ | | |
| azure-blue considerably more accentuated | 1066 | 0↑1700 °F |
| ↓ | | |
| azure-blue still more intense | 1067 | 0↑1800 °F |
| | | production process:<br>(followed from «very, very light green»)<br>2 g of wilsonite + 2 g of potassium carbonate: |
| light azure-blue | 1068 | 0↑1600 °F |
| ↓ | | |
| medium and vivid azure-blue | 1069 | 0↑1700 °F |
| ↓ | | |
| azure-blue considerably more intense | 1070 | 0↑1800 °F |
| | | mineral : copper<br>rock : reddish brown, with metallic luster<br>powder : reddish brown, with metallic luster<br>origin : unknown |
| medium azure-blue | 1070.1 | production process:<br>100 g of copper + 100 ml hydrochloric acid / soaking: 5 mo. / drying on hot plate (greenish turquoise fairly pronounced): 4 g + 20 ml ether / natural drying |
| | | mineral : copper<br>rock : reddish brown, with metallic luster<br>powder : reddish brown, with metallic luster<br>origin : unknown |

| | | |
|---|---|---|
| azure-blue a little more pale than «intense azure-blue» | 1071 | mineral : cement[1138]<br>powder : white<br><br>production process:<br>rock entirely covered with 1000 ml acetic acid / natural drying / removal of the crystals formed at the surface of the rock (the colour of the crystals: pronounced emerald-green): 2 g + 4 g of white cement[1138] + 6 cc of water / manual grinding / moulding / hardening (intense azure-blue) / irradiated with gamma rays at 18.85 Mrad |
| intense azure-blue | 1071.1 | mineral : copper<br>rock : reddish brown, with metallic luster<br>powder : reddish brown, with metallic luster<br>origin : unknown<br><br>production process:<br>4 g of copper + 20 ml ether / natural drying |
| | | mineral : anorthosite<br>rock : light grey<br>powder : very, very light grey<br>origin : rang Sainte-Germaine, Oka, Québec<br><br>production process:<br>(followed from «grey [with blue particles]»)<br>2 g of anorthosite + 2 g of sodium carbonate: |
| intense azure-blue | 1072 | 0↑1500 °F + 30 min at 1500 °F |
| intense azure-blue | 1073 | 0↑1500 °F + 45 min at 1500 °F |
| intense azure-blue | 1074 | 0↑1500 °F + 1 h at 1500 °F<br>(followed at «greyish blue») |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>2 g of wilsonite + 2 g of sodium carbonate: |
| powerful azure-blue | 1075 | 1600 °F / 1 h |
| azure-blue still more powerful | 1076 | 1600 °F / 2 h |

| | | |
|---|---|---|
| azure-blue still more powerful ↓ | 1077 | 1600 °F / 3 h |
| azure-blue still more powerful ↓ | 1078 | 1600 °F / 4 h |
| azure-blue still more powerful ↓ | 1079 | 1600 °F / 6 h |
| azure-blue still more powerful | 1080 | 1600 °F / 8 h |
| azure-blue very vivid and powerful | 1081 | mineral : bornite<br>rock : reddish brown (with localized green and bluish green oxidation)<br>powder : reddish brown<br>origin : Lac Musset, Fosse du Labrador, Québec<br><br><u>production process:</u><br>1500 °F / 1 h (medium reddish brown): 1 g + 40 ml nitric acid / soaking: 14 d. / separation of the liquid and the solid / natural drying / colour of the liquid[24,191] |
| very vivid azure-blue | 1082 | mineral : malachite<br>rock : ribboned variety of pronounced mint-green<br>powder : light and brilliant mint-green<br>origin : Katanga province, at 300 km from Lubumbachai, Zaïr, Africa<br><br><u>production process:</u><br>2 g of malachite + 20 ml sulphuric acid / natural drying (intense indigo-blue) / irradiated with electrons at 162,431 rad |
| mixture of particles | | |
| light azure-blue / green [in between «apple-green» and «mint-green»] | 1083 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «dark and vivid emerald-blue» and «medium and very vivid emerald-blue»)<br>2 g of bornite + 25 ml nitric acid / soaking: 6 d. / separation of the liquid and the solid / natural drying / colour of the solid deposited at the bottom of the liquid[184]<br>(followed at «mossy green») |

| | | |
|---|---|---|
| blue [between «azure-blue» and «bluish turquoise»] | | |
| very light blue [between «azure-blue» and «bluish turquoise»] | 1083.1 | mineral : copper<br>rock : reddish brown, with metallic luster<br>powder : reddish brown, with metallic luster<br>origin : unknown<br><br>production process:<br>100 g of copper + 100 ml hydrochloric acid / soaking: 5 mo. / natural drying (mint-green [malachite-green type]): 4 g + 20 ml ether / natural drying |
| royal-blue | | |
| | | mineral : fluorine<br>rock : very light fluor-green (cold mint-green type), translucid<br>powder : very light grey<br>origin : Rogers Mine, Madoc, Ontario<br><br>production process:<br>rock irradiated with neutrons at $10^{12}$ neutrons / $cm^2$ during: |
| royal-blue | 1084 | 300 seconds[192] |
| darker royal-blue | 1085 | 600 seconds[193] |
| royal-blue still more intense | 1086 | 1,000 seconds[194] |
| royal-blue still more intense | 1087 | 1,500 seconds[120] |
| royal-blue still more intense | 1088 | 2,000 seconds[195] |
| royal-blue still more intense | 1089 | 3,000 seconds[196] |
| royal-blue still more intense and saturated | 1090 | 6,000 seconds |
| royal-blue more intense and saturated | 1091 | 10,000 seconds[197] |
| royal-blue much more intense | 1092 | 20,000 seconds |
| royal-blue still considerably more | 1093 | 40,000 seconds[137] |

168

| | | |
|---|---|---|
| intense | | |
| intense royal-blue | 1094 | mineral : sodalite<br>rock : light cold blue<br>powder : light grey (light blue tone)<br>origin : Bancroft, Ontario<br><br><u>production process:</u><br>(followed from «greenish blue»)<br>2 g of sodalite + 2 g of sodium carbonate / 0↑1900 °F + 1 h at 1900 °F |
| intense royal-blue | 1094.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>powder finely crushed and heated 0↑1100 °F (Naples yellow [green tone]): .50 g + 15 ml nitric acid / soaking: 2 d. / slow drying on hot plate (light blue): .1 g + 50 cc of transparent polyester resin + 1% of catalyst / manual grinding / moulding / deposited in an hermetically closed container with a cover and deposited in a drying oven for plastic at 100 °F until hardening |
| very powerful royal-blue | 1095 | <u>production process:</u><br>rock entirely covered with 20 ml nitric acid / soaking: 1 wk. / irradiated with gamma rays at 11.4 Mrad / drying on hot plate, completed on sand bath / colour of the liquid[200] |
| intense royal-blue, dark and brilliant | 1096 | mineral : smaltite[25], variety of skutterudite<br>rock : dark iron-grey, with silver metallic brilliance<br>powder : dark grey<br>origin : Cobalt, Ontario<br><br><u>production process:</u><br>(followed from «dark grey [with "dark royal-blue" particles]» and «iron-grey darker than "light iron-grey" [with "dark royal-blue" particles]»)<br>1 g of smaltite + 2.50 g of sodium carbonate / 1800 °F / 1 h[1197,1261]<br>(followed at «dark greenish blue») |

| | | |
|---|---|---|
| royal-blue (violet tone) | | |
| acute and cold royal-blue (very light violet tone) | 1097 | mineral : fluorine<br>rock : very light fluor green (cold mint-green type), translucid<br>powder : very light grey<br>origin : Rogers Mine, Madoc, Ontario<br><br>production process:<br>rock irradiated with electrons at 164,800 rad (greenish blue more intense than «very light greenish blue»), then at 155,082 rad (greenish blue still more intense), then with neutrons during 2,000 seconds at $10^{12}$ / $cm^2$ / sec[198,199] |
| royal-blue (green tone) | | |
| very intense royal-blue (emerald-green tone) | 1098 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>powder finely crushed and heated 0†1200 °F (Naples yellow): .50 g + 15 ml sulphuric acid / soaking: 2 d. / slow drying on hot plate (very intense blue): .50 g + 50 cc of transparent polyester resin + 1% of catalyst / manual grinding / deposited in an hermetically closed container with a cover and put in a drying oven for plastic at 100 °F until hardened |
| royal-blue (emerald-green tone) darker and more accentuated than «very intense royal-blue (emerald | 1099 | production process:<br>powder finely crushed and heated 0†1200 °F (Naples yellow): .50 g + 15 ml sulphuric acid / soaking: 2 d. / slow drying on hot plate (very intense blue): .50 g + 50 cc of transparent polyester resin + 1% of catalyst / manual grinding / deposited in an hermetically closed container with a cover and put in a drying oven for plastic at 100 °F until hardened (very intense royal-blue [emerald-green tone]) / irradiated with gamma rays at:<br>5.7 Mrad |

| | | |
|---|---|---|
| - green tone)» ↓ royal-blue much darker (emerald-green tone) | 1100 | 17.1 Mrad |
| emerald-blue | | |
| medium, very vivid emerald-blue | 1101 | mineral : bornite<br>rock : reddish brown (with localized green and bluish green oxidation)<br>powder : reddish brown<br>origin : Lac Musset, Fosse du Labrador, Québec<br><br>production process:<br>(followed from «mixture of particles: bluish green / light and vivid apple-green»)<br>2 g of bornite + 20 ml nitric acid + 5 ml hydrochloric acid / soaking: 6 d. / separation of the liquid and the solid / natural drying / colour of the liquid[187]<br>(followed at «dark and vivid emerald-blue», at «mixture of particles: medium phtalo-green / intense greenish blue» and «mixture of particles: light azure-blue / green [between "apple-green" and "mint-green"]») |
| intense emerald-blue | 1102 | mineral : pyrolusite[101]<br>rock : black (light brown tone), mat<br>powder : black (light brown tone), mat<br>origin : probably Nova Scotia<br><br>mineral : sulphur<br>rock : brilliant yellow<br>powder : brilliant yellow<br>origin : unknown<br><br>production process:<br>(followed from «dark chocolate-brown»)<br>1 g of pyrolusite + 2 g of sodium carbonate / 0↑1700 °F / cooling / addition of 1 g of sulphur / 0↑1700 °F |
| very powerful | 1102.1 | mineral : malachite<br>rock : ribboned variety of pronounced mint-green<br>powder : light and brilliant mint-green<br>origin : Katanga provin ce, at 300 km from Lubumbachai, Zaïr, Africa<br><br>production process:<br>1 g of malachite + 6.50 g glass powder |

| | | |
|---|---|---|
| emerald-blue | | (spruce pine batch) / manual grinding / deposited on a ceramic plate at the state of a biscuit / heated in a furnace 0↑1000 °C in normal atmosphere / slow cooling in furnace |
| | | <u>production process:</u><br>1 g of malachite + 6.50 g of glass powder (spruce pine batch) / manual grinding / deposited on a ceramic plate at the state of a biscuit / heated in a furnace 0↑1000 °C in normal atmosphere / slow cooling in the furnace (very powerful emerald-blue) / irradiation with gamma rays at: |
| emerald-blue a little darker than «very power-ful emerald-blue»<br>↓ | 1102.2 | 2.47 Mrad |
| emerald-blue still slightly darker | 1102.3 | 7.41 Mrad |
| dark and vivid emerald-blue | 1103 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «medium, very vivid emerald-blue»)<br>2 g of bornite + 25 ml nitric acid / soaking:6 d. / separation of the liquid and the solid / natural drying / colour of the liquid[24,202]<br>(followed at «mixture of particles: light azure-blue / green [between "apple-green" and "mint-green"]») |
| phtalo-blue[202a] | | |
| | | mineral : andulusite<br>rock : light brownish grey<br>powder : light grey<br>origin : Bimbowrie, South Australia<br><br>mineral : sulphur<br>rock : brilliant yellow<br>powder : brilliant yellow<br>origin : unknown<br><br><u>production process:</u><br>(followed from «mixture of particles: dark grass-green / blackish brown») |

| | | |
|---|---|---|
| phtalo-blue | 1104 | 1 g of andulusite + 2 g of sodium carbonate + 1 g of sulphur / 0↑1700 °F[202a,203] |
| phtalo-blue | 1105 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>production process:<br>1 g of tremolite + 3 g of sodium carbonate + 1 g of sulphur / 0↑1600 °F[202a,204] |
| phtalo-blue | 1106 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : sulphur<br>rock : brilliant yellow<br>powder : brilliant yellow<br>origin : unknown<br><br>production process:<br>.50 g of wilsonite + .50 g of sodium carbonate + .50 g of sulphur / 1700 °F / 1 h[202a,205] |
| dark and vivid phtalo-blue | 1106.1 | mineral : sodalite<br>rock : indigo-blue, slightly translucid<br>powder : light grey (light blue tone)<br>origin : possibly Africa<br><br>mineral : sulphur<br>rock : brilliant yellow<br>powder : brilliant yellow<br>origin : unknown<br><br>production process:<br>1 g of sodalite + 2 g of sodium carbonate + 1 g of sulphur / 1600 °F / 1 h[202a,206] |
| | 1107 | mineral : obsidian<br>rock : dark phtalo-blue[202a]<br>origin : zone of Grand Rapids, on the Matagami river, at the embouchure of Adams Creek, Ontario |

| | | |
|---|---|---|
| phtalo-blue darker than «dark phtalo-blue» | 1108 | production process:<br>rock irradiated with gamma rays at 55 Mrad |
| blue (grey tone) | | |
| greyish blue tone or bluish grey | 1109 | mineral : fluorine<br>rock : white (pink tone), translucid<br>powder : white (grey reflection)<br>origin : Saint-Lawrence Fluorspar Company, Saint-Lawrence, Newfoundland<br><br>production process:<br>powder irradiated with gamma rays at 18.85 Mrad |
| | | mineral : dolomite<br>rock : white (localized yellow reflection), crystalline et translucid<br>powder : white<br>origin : Bristol district, Pontiac county, Québec<br><br>production process:<br>rock irradiated with gamma rays at: |
| very, very light greyish blue tone | 1110 | 5 Mrad |
| ↓ | | |
| greyish blue tone a little more accentuated | 1111 | 10 Mrad |
| ↓ | | |
| greyish blue tone still a little more accentuated | 1112 | 57.4 Mrad |
| ↓ | | |
| greyish blue tone still a little more accentuated | 1113 | 65.704 Mrad |
| ↓ | | |
| greyish blue tone still a little more accentuated | 1114 | 102.4 Mrad[207]<br>(followed at «2 zones: greyish blue tone / brownish grey tone») |
| | | mineral : pyrophillite<br>rock : light beige (grey and pink tones), opaque<br>powder : very light beige (grey and orange-pink tones)<br>origin : Carpentier district, Abitibi, Québec |

174

| | | |
|---|---|---|
| very, very pale bluish grey | 1115 | <u>production process:</u><br>2 g of pyrophillite + 2 g of sodium carbonate / 0↑1600 °F + 1 h at 1600 °F (light greenish blue [grey tone]) / irradiated with electrons at 302,831 rad[45] |
| | | mineral : anorthosite<br>rock : light grey<br>powder : very, very light greyish beige<br>origin : rang Sainte-Germaine, Oka, Québec<br><br><u>production process:</u><br>(followed from «intense azure-blue»)<br>2 g of anorthosite + 2 g of sodium carbonate: |
| greyish blue | 1116 | 0↑1600 °F + 1 h at 1600 °F[208] |
| greyish blue | 1117 | 0↑1700 °F + 1 h at 1700 °F |
| greyish blue | 1118 | 0↑1800 °F + 1 h at 1800 °F |
| ↓ greyish blue | 1119 | 0↑1900 °F + 1 h at 1900 °F |
| | | mineral : bornite<br>rock : reddish brown (with localized green and bluish green oxidation)<br>powder : reddish brown<br>origin : Lac Musset, Fosse du Labrador, Québec<br><br><u>production process:</u> |
| greyish blue | 1120 | 12 g of bornite + 40 ml phosphoric acid / soaking: 3 h / separation of the 1st liquid and the solid / colour of the 1st liquid |
| ↓ greyish blue | 1121 | 12 g of bornite + 40 ml phosphoric acid / soaking: 3 h / separation of the 1st liquid and the solid / colour of the 1st liquid (greyish blue) / addition of 40 ml phosphoric acid to the same solid / soaking: 1 wk. / separation of the 2nd liquid and the solid / drying on hot plate (still humid) / colour of the 2nd liquid[7] |
| | | mineral : copper<br>rock : reddish brown, with metallic luster<br>powder : reddish brown, with metallic luster<br>origin : unknown<br><br><u>production process:</u><br>(followed from «peacock-blue») |
| greyish blue | 1122 | 100 g of copper + 100 ml hydrochloric acid / soaking: 5 mo. / drying on hot plate (greenish turquoise moderately pronounced) / 0↑500 °F (grey [light blue tone]): .50 g + 5 ml ammonia / natural |

| | | |
|---|---|---|
| | | drying<br>(followed at «grey») |
| greyish blue | 1123 | mineral : fluorine<br>rock : very pale yellow, translucid<br>powder : white (light yellow reflection)<br>origin : Ohio, United States<br><br>production process:<br>1 g of fluorine + 1 cc of white transparent synthetic enamel paint for the car / manual grinding / application on a piece of steel sheet for the body measuring 1" x 1" (greyish cream) / irradiated with gamma rays at 3.77 Mrad<br>(followed from «medium iron-grey [light lilac tone]») |
| greyish blue | 1124 | mineral : microcline<br>rock : white (grey reflection)<br>powder : white (grey reflection)<br>origin : Buckingham, Québec<br><br>production process:<br>(followed from «green»)<br>2 g of microcline + 2 g of sodium carbonate / 0↑1900 °F + 1 h at 1900 °F |
| greyish blue | 1125 | mineral : orthoclase<br>rock : light pinkish beige<br>powder : very light beige<br>origin : mine near Buckingham, Papineau county, Québec<br><br>production process:<br>(followed from «intense greenish blue»)<br>2 g of orthoclase + 2 g of sodium carbonate / 0↑1800 °F + 1 h at 1800 °F<br>(followed at «bluish green») |
| greyish blue | 1126 | mineral : sodalite<br>rock : light cold blue<br>powder : light grey (light blue tone)<br>origin : Bancroft, Ontario<br><br>production process:<br>(followed from «dark indigo-blue»)<br>2 g of sodalite + 2 g of sodium carbonate / 0↑1700 °F + 1 h at 1700 °F<br>(followed at «greenish blue») |
| | | mineral : halite[41]<br>rock : colourless<br>powder : colourless<br>origin : Seleine Mine, Iles-de-la-Madeleine, |

| | | |
|---|---|---|
| | | Québec |
| dark greyish blue or dark bluish grey | 1127 | production process:<br>2 g of halite + 2 g of sodium carbonate / 0↑1100 °F + 1 h at 1100 °F (light grey) / irradiated with gamma rays at 64.7 Mrad<br>(followed at «violet-blue [grey reflection]») |
| greyish blue (green tone) | | |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec |
| dark and intense greyish blue (green tone) | 1128 | production process:<br>(followed from «accentuated mossy green»)<br>2 g of molybdenite + 2 g of sodium carbonate / 0↑1100 °F + 1 h at 1100 °F (creamy yellow [light green tone]) / irradiated with gamma rays at 423.88 Mrad |

BLUE (GREEN TONE)

| colour obtained | number | mineral / production process |
|---|---|---|
| bluish turquoise | | |
| very light bluish turquoise, almost white | 1129 | mineral : amethyst<br>rock : violet, translucid<br>powder : light grey (lilac tone)<br>origin : Thunderbay, Ontario<br><br>production process:<br>(followed from «azure-blue considerably lighter than "light azure-blue"»)<br>2 g of amethyst + 2 g of sodium carbonate / 0↑1800 °F + 1 h at 1800 °F (azure-blue) / irradiated with electrons at 302,831 rad[45] |
| very light bluish turquoise, almost white | 1130 | mineral : copper<br>rock : reddish brown, with metallic luster<br>powder : reddish brown, with metallic luster<br>origin : unknown<br><br>production process:<br>(followed from «very, very light green [almost white]»)<br>100 g of copper + 100 ml nitric acid / soaking: 5 mo. / natural drying (light bluish turquoise): 2 g + 20 ml phosphoric acid / soaking: 3 d. / drying on hot plate (still humid) / colour of the solid[59] |
| very light bluish turquoise | 1131 | mineral : amazonite<br>rock : greenish turquoise<br>powder : white (turquoise reflection)<br>origin : Lac Saint-Jean, Québec<br><br>production process:<br>2 g of amazonite + 20 ml phosphoric acid / soaking: 3 d. / drying on hot plate (still humid) |
| very light bluish turquoise | 1132 | production process:<br>(followed from «yellowish green»)<br>2 g of amazonite + 20 ml hydrochloric acid / soaking: 3 d. / drying on hot plate (very light yellowish green) / irradiated with electrons at 302,831 rad[45] |

| | | |
|---|---|---|
| very light bluish turquoise | 1133 | mineral : copper<br>rock : reddish brown, with metallic luster<br>powder : reddish brown, with metallic luster<br>origin : unknown<br><br>production process:<br>100 g of copper + 100 ml nitric acid / soaking: 5 mo. / natural drying (light bluish turquoise) / irradiated with electrons at 302,831 rad[45] |
| bluish turquoise lighter than «light bluish turquoise» | 1134 | production process:<br>100 g of copper + 100 ml nitric acid / soaking: 5 mo. / natural drying (light bluish turquoise): .50 g + 5 ml ammonia / natural drying<br>(followed at «violet-blue» and «bluish turquoise [greyish tone]») |
| light bluish turquoise | 1135 | production process:<br>100 g of copper + 100 ml nitric acid / soaking: 5 mo. / natural drying |
| light bluish turquoise<br>↓<br>bluish turquoise more accentuated than «light bluish turquoise» | 1136<br><br>1137 | mineral : beryl<br>rock : light blue, slightly translucid<br>powder : light grey<br>origin : Abitibi, Québec<br><br>production process:<br>(followed from «very light azure-blue»)<br>2 g of beryl + 2 g of sodium carbonate:<br>0↑1600 °F + 1 h at 1600 °F<br><br>0↑1700 °F + 1 h at 1700 °F<br><br>(followed at «very light beige») |
| light bluish turquoise | 1138<br><br>1139 | mineral : graphite<br>rock : dark grey, with metallic brilliance<br>powder : dark grey, with metallic brilliance<br>origin : Grenville, Québec<br><br>production process:<br>1 g of graphite + 3 g of potassium carbonate / 0↑1500 °F<br>(followed at «dark bluish turquoise») |
| light bluish | 1139.1 | production process:<br>(followed from «dark colour [between "apple-green" and "olive-green"]»)<br>2% of graphite is mixed with molten glass (crys- |

| | | |
|---|---|---|
| turquoise type | | tal) and the entirety is melted at 2,400 °F |
| | | mineral : beryl<br>rock : light blue (near turquoise), slightly translucid<br>powder : light grey<br>origin : Lacorne district, Abitibi, Québec<br><br>production process:<br>(followed from «light azure-blue» and «very light azure-blue»)<br>2 g of beryl + 2 g of potassium carbonate: |
| light bluish turquoise | 1140 | 0↑1600 °F |
| ↓ | | |
| bluish turquoise more accentuated than «light bluish turquoise» | 1141 | 0↑1700 °F |
| ↓ | | |
| bluish turquoise more accentuated than «light bluish turquoise» | 1142 | 0↑1800 °F |
| | | mineral : copper<br>rock : reddish brown, with metallic luster<br>powder : reddish brown, with metallic luster<br>origin : unknown<br><br>production process: |
| bluish turquoise a little darker than «light bluish turquoise» | 1143 | 100 g of copper + 100 ml nitric acid / soaking: 5 mo. / natural drying (light bluish turquoise) / 0↑350 °F<br>(followed at «greenish turquoise») |
| | | production process:<br>100 g of copper + 100 ml nitric acid / soaking: 5 mo. / natural drying (light bluish turquoise) / irradiated with gamma rays at: |
| bluish turquoise a little darker than «light bluish turquoise» | 1144 | 64.7 Mrad |
| ↓ | | |
| bluish turquoise a little more blue, intense and dark | 1145 | 424.7 Mrad |
| | | production process: |
| bluish turquoise considerably more | 1146 | 100 g of copper + 100 ml hydrochloric acid / soaking: 5 mo. / drying on hot plate (greenish tur- |

| | | |
|---|---|---|
| pale than «bluish turquoise» | | quoise fairly pronounced) / 0↑400 °F (greenish turquoise less pronounced than «greenish turquoise fairly pronounced»): .50 g + 5 ml ammonia (bluish turquoise [green accentuated tone]) / irradiated with electrons at 302,831 rad[45] |
| bluish turquoise paler than «bluish turquoise» | 1147 | <u>production process:</u><br>100 g of copper + 100 ml hydrochloric acid / soaking: 5 mo. / drying on hot plate (greenish turquoise fairly more pronounced) / 0↑400 °F (greenish turquoise less pronounced than «greenish turquoise fairly pronounced»): .50 g + 5 ml ammonia (bluish turquoise [accentuated green tone]) / irradiated with gamma rays at 63.88 Mrad<br>(followed at «bluish green [mossy texture] darker than "pronounced bluish green"») |
| blue (light turquoise tone) | 1148 | <u>production process:</u><br>100 g of copper + 100 ml hydrochloric acid / soaking: 5 mo. / drying on hot plate (fairly pronounced greenish turquoise): .50 g + 5 ml ammonia / natural drying<br><br>(followed at «intense greenish blue») |
| blue (light turquoise tone) | 1149 | 100 g of copper + 100 ml hydrochloric acid / soaking: 5 mo. / drying on hot plate (greenish turquoise fairly pronounced) / 0↑350 °F (greenish turquoise a little more pronounced than «greenish turquoise fairly pronounced»): .50 g + 5 ml ammonia / natural drying |
| bluish turquoise (accentuated green tone) | 1150 | 100 g of copper + 100 ml hydrochloric acid / soaking: 5 mo. / drying on hot plate (greenish turquoise fairly pronounced) / 0↑400 °F (greenish turquoise less pronounced than «greenish turquoise fairly pronounced»): .50 g + 5 ml ammonia / natural drying |
| ↓<br>bluish turquoise (green tone still more accentuated) | 1151 | 100 g of copper + 100 ml hydrochloric acid / soaking: 5 mo. / drying on hot plate (greenish turquoise fairly pronounced) / 0↑425 °F (greenish turquoise [light grey tone]): .50 g + 5 ml ammonia / natural drying<br>(followed at «peacock-blue») |
| | | mineral : apophyllite<br>rock : milky white, translucid<br>powder : white<br>origin : Gaspé Copper Mine, Gaspé, Québec |

| | | |
|---|---|---|
| bluish turquoise | 1151.1 | production process:<br>(followed from «light bluish green»)<br>2 g of apophyllite + 2 g of sodium carbonate / 0↑1800 °F + 1 h at 1800 °F |
| bluish turquoise | 1152 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>2 g of malachite + 20 ml ammonia / natural drying |
| bluish turquoise | 1153 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>.50 g of wilsonite + .50 g of sodium carbonate / 1600 °F / 1 h<br>(followed at «grass-green») |
| bluish turquoise | 1154 | mineral : copper<br>rock : reddish brown, with metallic luster<br>powder : reddish brown, with metallic luster<br>origin : unknown<br><br>production process:<br>(followed at «light green»)<br>100 g of copper + 100 ml hydrochloric acid / soaking: 5 mo. / drying on hot plate (greenish turquoise fairly pronounced): 2 g + 20 ml phosphoric acid / soaking: 3 d. / drying on hot plate (still humid) / colour of the solid[210] |
| medium bluish turquoise | 1155 | mineral : chalcocite<br>rock : dark iron-grey (localized turquoise oxidation)<br>powder : dark iron-grey<br>origin : Butte, Montana, United States<br><br>production process:<br>0↑1900 °F (dark iron-grey): .60 g + 200 ml phosphoric acid / soaking: 4 years[213] / drying on hot plate (still humid) / colour of the liquid[140] |

| | | |
|---|---|---|
| medium bluish turquoise | 1156 | mineral : amazon stone<br>rock : light greenish turquoise, translucid<br>powder : white (turquoise reflection)<br>origin : unknown<br><br>production process:<br>4 g of amazon stone + 40 ml nitric acid / soaking: 1 wk. / separation of the liquid and the solid / natural drying / colour of the liquid[160] |
| medium and intense bluish turquoise | 1157 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «greenish blue very slightly darker than "light greenish blue"»)<br>2 g of malachite + 25 ml of hydrochloric acid / natural drying / irradiated with gamma rays at 424.7 Mrad |
| intense bluish turquoise | 1158 | mineral : bornite<br>rock : reddish brown (with localized green and bluish green oxidation)<br>powder : reddish brown<br>origin : Lac Musset, Fosse du Labrador, Québec<br><br>production process:<br>(followed from «pronounced greenish turquoise»)<br>1 g of bornite + 30 ml nitric acid / soaking: 6 d. / separation of the liquid and the solid / natural drying / colour of the liquid[183]<br>(followed at «light and very vivid azure-blue» and «pale apple-green») |
| bluish turquoise considerably more accentuated than «pronounced bluish turquoise» | 1159<br><br><br><br><br><br>1160 | mineral : amazonite<br>rock : pronounced turquoise<br>powder : white (turquoise reflection)<br>origin : Lac Sairs, Témiscamingue, Abitibi, Québec<br><br>production process:<br>powder irradiated with neutrons during 2,000 seconds at $10^{12}$ neutrons / cm$^2$ / sec[211,212] |
| | | mineral : graphite<br>rock : dark grey, with metallic brilliance |

| | | |
|---|---|---|
| dark bluish turquoise | 1161 | powder : dark grey, with metallic brilliance<br>origin : Grenville, Québec<br><br>production process:<br>(followed at «light bluish turquoise»)<br>1 g of graphite + 3 g of potassium carbonate / 0↑1600 °F<br>(followed at «dark and saturated emerald-green») |
| bluish turquoise (grey tone) | | |
| light bluish turquoise (grey tone) | 1161.1 | mineral : copper<br>rock : reddish brown, with metallic luster<br>powder : reddish brown, with metallic luster<br>origin : unknown<br><br>production process:<br>(followed from «bluish turquoise lighter than "light bluish turquoise"»)<br>100 g of copper + 100 ml nitric acid / soaking: 5 mo. / natural drying (light bluish turquoise) / 0↑300 °F (bluish turquoise slightly darker than «light bluish turquoise»): .50 g + 5 ml ammonia / natural drying |
| ↓ light bluish turquoise (grey tone) | 1162 | 100 g of copper + 100 ml nitric acid / soaking: 5 mo. / natural drying (light bluish turquoise) / 0↑350 °F (bluish turquoise slightly darker than «light bluish turquoise»): .50 g + 5 ml ammonia / natural drying |
| ↓ bluish turquoise (light grey tone) | 1163 | 100 g of copper + 100 ml nitric acid / soaking: 5 mo. / natural drying (light bluish turquoise) / 0↑375 °F (greenish turquoise): .50 g + 5 ml ammonia / natural drying |
| ↓ bluish turquoise (grey tone more accentuated) | 1164 | 100 g of copper + 100 ml nitric acid / soaking: 5 mo. / natural drying (light bluish turquoise) / 0↑400 °F (greyish green): .50 g + 5 ml ammonia / natural drying |
| ↓ bluish turquoise (grey tone still more accentuated) | 1165 | 100 g of copper + 100 ml nitric acid / soaking: 5 mo. / natural drying (light bluish turquoise) / 0↑450 °F (greyish green darker than «greyish green»): .50 g + 5 ml ammonia / natural drying<br>(followed at «iron grey») |
| blue (green tone)[214] | | |
| | | mineral : crocidolite<br>rock : dark greyish blue<br>powder : pale greyish blue |

| | | |
|---|---|---|
| | | origin : Griqualand district, South Africa |
| | | <u>production process:</u> |
| | | rock irradiated with gamma rays[251] at: |
| greyish blue (light green tone) very, very lightly more pale than «dark greyish blue (green tone)» ↓ | 1166 | 57.4 Mrad |
| greyish blue still lightly more pale (green tone lightly more accentuated) ↓ | 1167 | 102.4 Mrad |
| which evolves to | 1168 | 148.4 Mrad |
| ↓ | 1169 | 201.6 Mrad |
| ↓ | 1170 | 247.6 Mrad |
| ↓ | 1171 | 255.924 Mrad |
| pale greenish blue | 1172 | 287.3 Mrad (followed at «pale green») |
| | | mineral : bornite |
| | | rock : reddish brown (with localized green and bluish green oxidation) |
| | | powder : reddish brown |
| | | origin : Lac Musset, Fosse du Labrador, Québec |
| | | <u>production process:</u> |
| greenish blue pastel (covering a «pale phtalo-green powder») | 1173 | 1500 °F / 1 h (medium brownish red): 1 g + 40 ml hydrochloric acid / soaking: 14 d. / separation of the liquid and the solid / natural drying / colour of the liquid[217,217a] |
| | | mineral : fluorine |
| | | rock : very light fluor-green (cold mint-green type), translucid |
| | | powder : very light grey |
| | | origin : Rogers Mine, Madoc, Ontario |
| | | <u>production process:</u> |
| | | (followed from «cold blue») |
| | | rock irradiated with electrons at: |
| greenish blue more intense than «very light greenish blue» ↓ | 1174 | 164,800 rad |
| greenish blue still more intense | 1175 | 305,200 rad[73,220] (followed at «blue») |
| | | mineral : beryl |

| | | |
|---|---|---|
| | | rock : very light greenish blue, slightly translucid<br>origin : Brassard district, Berthier county, Québec<br><br>production process:<br>rock irradiated with electrons at: |
| greenish blue more intense than «very light greenish blue»<br>↓ | 1176 | 164,800 rad |
| greenish blue more profound and intense | 1177 | 305,200 rad[73] |
| | | mineral : pyrophillite<br>rock : light beige (grey and pink tones), opaque<br>powder : very light beige (grey and orange-pink tones)<br>origin : Carpentier district, Abitibi, Québec<br><br>production process:<br>(followed from «very light beige»)<br>2 g of pyrophillite + 2 g of sodium carbonate: |
| light greenish blue (grey tone)<br>↓ | 1178 | 0↑1600 °F + 1 h at 1600 °F |
| dark greenish blue<br>↓ | 1179 | 0↑1700 °F + 1 h at 1700 °F |
| greenish blue lighter than «dark greenish blue» | 1180 | 0↑1800 °F + 1 h at 1800 °F<br><br>(followed at «blackish grass-green») |
| | | mineral : beryl<br>rock : light blue, slightly translucid<br>powder : light grey<br>origin : Abitibi, Québec<br><br>production process: |
| light blue (light green or yellow tone) | 1181 | 2 g of beryl + 25 ml nitric acid / soaking: 24 h / drying on hot plate |
| | 1182 | mineral : copper arsenate<br>powder : light greenish blue<br>origin : City Chemical Corporation, New York<br><br>production process: |
| greenish blue more blue, intense | 1183 | irradiated with electrons: 305,200 rad[73] |

| | | |
|---|---|---|
| and vivid than «light greenish blue» | | |
| light and very vivid greenish blue | 1184 | mineral : malachite<br>rock : ribboned variety of pronounced mint-green<br>powder : light and brilliant mint-green<br>origin : Katanga province, at 300 km from Lubumbachai, Zaïr, Africa<br>production process:<br>2 g of malachite + 25 ml hydrochloric acid / natural drying |
| | | mineral : siderite<br>rock : caramel-brown (grey tone)<br>powder : light beige (orange tone)<br>origin : De-Mix quarry, North side of Mont Saint-Hilaire, Rouville county, Québec<br>production process:<br>(followed from «intense grass-green»)<br>2 g of siderite + 2 g of sodium carbonate: |
| light greenish blue<br>↓ | 1185 | 0↑1600 °F + 1 h at 1600 °F |
| greenish blue more intense<br>↓ | 1186 | 0↑1700 °F + 1 h at 1700 °F |
| greenish blue still more intense<br>↓ | 1187 | 0↑1800 °F + 1 h at 1800 °F |
| greenish blue equivalent to the previous one | 1188 | 0↑1900 °F + 1 h at 1900 °F |
| greenish blue very lightly darker than «light greenish blue» | 1189 | mineral : malachite<br>rock : ribboned variety of pronounced mint-green<br>powder : light and brilliant mint-green<br>origin : Katanga province, at 300 km from Lubumbachai, Zaïr, Africa<br>production process:<br>2 g of malachite + 25 ml hydrochloric acid / natural drying (light and very vivid greenish blue) / irradiated with gamma rays at 64.7 Mrad (followed at «medium and intense bluish turquoise») |
| | | mineral : anorthosite<br>rock : dark grey<br>powder : medium grey<br>origin : Jonquière, Lac Saint-Jean, Québec |

| | | |
|---|---|---|
| greenish blue | 1190 | <u>production process:</u><br>.30 g of anorthosite + .50 g of sodium carbonate / 1700 °F / 1 h[218] |
| greenish blue | 1191 | mineral : chalcocite<br>rock : dark iron-grey (with localized tur-quoise oxidation)<br>powder : dark iron-grey<br>origin : Butte, Montana, United States<br><br><u>production process:</u><br>0↑1900 °F (dark iron-grey): 1 g + 80 ml nitric acid / soaking: 2 wk. / separation of the liquid and the solid / natural drying / colour of the liquid[219]<br>(followed at «dark green» and «very light green») |
| greenish blue | 1192 | mineral : microcline<br>rock : white (grey reflection)<br>powder : white (grey reflection)<br>origin : Buckingham, Québec<br><br><u>production process:</u><br>(followed from «blue»)<br>2 g of microcline + 2 g of sodium carbonate / 0↑1700 °F + 1 h at 1700 °F<br>(followed at «green») |
| blue (green ac-centuated tone) | 1193 | mineral : beryl<br>rock : very light greenish blue, slightly translucid<br>origin : Brassard district, Berthier county, Québec<br><br><u>production process:</u><br>rock hermetically wrapped in bread dough / irra-diated with gamma rays at 5.7 Mrad[221] |
| greenish blue | 1193.1 | mineral : orpiment<br>rock : vivid yellow (orange tone)<br>powder : vivid yellow (orange tone)<br>origin : Nevada, United States<br><br>mineral : Prussian-blue<br>powder : Prussian-blue<br>origin : Merck & Co. Inc., N.J., United States<br><br><u>production process:</u><br>1 g of orpiment + 1 g of Prussian-blue |
| of various tones | 1193.2 | 1 g of orpiment + 1 g of Prussian-blue / grinding / 150 °F / 10 min. |

188

| | | |
|---|---|---|
| ↓ | 1193.3 | 1 g of orpiment + 1 g of Prussian-blue / grinding / 450 °F / 10 min. |
| greenish blue | 1194 | mineral : chrysocolla<br>rock : light greenish turquoise<br>powder : very light greenish turquoise<br>origin : Mexico<br><br>production process:<br>2 g of chrysocolla + 20 ml sulphuric acid / soaking: 3 d. / drying on hot plate[24,223] |
| variety of greenish blues and of greens (most are in the tones of «greenish turquoise») | 1195 | production process:<br>1 g of chrysocolla + 1 ml ammonia / natural drying |
| | 1196 | 1 g of chrysocolla + 2 ml ammonia / natural drying |
| | 1197 | 1 g of chrysocolla + 3 ml ammonia / natural drying |
| | 1198 | 1 g of chrysocolla + 4 ml ammonia / natural drying |
| | 1199 | 1 g of chrysocolla + 5 ml ammonia / natural drying |
| | 1200 | 1 g of chrysocolla + 10 ml ammonia / natural drying |
| | 1201 | 1 g of chrysocolla + 15 ml ammonia / natural drying |
| | 1202 | 1 g of chrysocolla + 20 ml ammonia / natural drying |
| | 1203 | 1 g of chrysocolla + 25 ml ammonia / natural drying |
| ↓ | 1204 | 5 g of chrysocolla + 25 ml ammonia / natural drying |
| greenish blue | 1205 | mineral : copper<br>rock : reddish brown, with metallic luster<br>powder : reddish brown, with metallic luster<br>origin : unknown<br><br>production process:<br>(followed from «light greenish turquoise»)<br>100 g of copper + 100 ml hydrochloric acid / soaking: 5 mo. / natural drying (mint-green [malachite] |

189

| | | |
|---|---|---|
| | | -green type]): 4 g + 20 ml ammonia / natural drying |
| greenish blue | 1206 | mineral : sodalite<br>rock : light cold blue<br>powder : light grey (light blue tone)<br>origin : Bancroft, Ontario<br><br><u>production process:</u><br>(followed from «greyish blue»)<br>2 g of sodalite + 2 g of sodium carbonate /<br>0↑1800 °F + 1 h at 1800 °F<br>(followed at «intense royal-blue») |
| greenish blue | 1207 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>(followed from «azure-blue more intense than "light azure-blue"»)<br>1 g of wilsonite + 1.50 g of sodium carbonate /<br>1600 °F / 1 h<br>(followed at «very intense greenish blue») |
| intense greenish blue | 1208 | mineral : Gaspé agate<br>rock : marbled nodule with shaded tints of white, pink and grey, slightly translucid<br>powder : very light pinkish grey<br>origin : Mont Lyall, Gaspésie, Québec<br><br>mineral : sulphur<br>rock : brilliant yellow<br>powder : brilliant yellow<br>origin : unknown<br><br><u>production process:</u><br>1 g of agate + 2 g of sodium carbonate + 1 g of sulphur / 1600 °F / 1 h[224] |
| intense greenish blue | 1209 | mineral : amethyst<br>rock : violet, translucid<br>powder : light grey (lilac tone)<br>origin : Thunderbay, Ontario<br><br><u>production process:</u><br>(followed from «azure-blue»)<br>1 g of amethyst + 1 g of sodium carbonate /<br>1600 °F / 1 h |

| | | |
|---|---|---|
| intense greenish blue | 1210 | mineral : anorthosite<br>rock : light grey<br>powder : very, very light greyish beige<br>origin : rang Sainte-Germaine, Oka, Québec<br><br>production process:<br>.76 g of anorthosite + 1.26 g of sodium carbonate / 1700 °F / 1 h[224,225] |
| | 1211 | mineral : labrador<br>rock : blackish grey<br>powder : medium grey<br>origin : Lac Saint-Jean, Québec<br><br>production process:<br>(followed from «olive-green [yellow tone]»)<br>2 g of labrador + 2 g of sodium carbonate: |
| intense greenish blue<br>↓ | 1212 | 0↑1800 °F + 1 h at 1800 °F |
| greenish blue still more intense | 1213 | 0↑1900 °F + 1 h at 1900 °F |
| intense greenish blue | 1214 | mineral : copper<br>rock : reddish brown, with metallic luster<br>powder : reddish brown, with metallic luster<br>origin : unknown<br><br>production process:<br>(followed from «blue [light turquoise tone]»)<br>100 g of copper + 100 ml hydrochloric acid / soaking: 5 mo. / drying on hot plate (greenish turquoise fairly pronounced): 4 g + 20 ml ammonia / natural drying |
| intense greenish blue | 1215 | mineral : orthoclase<br>rock : light pinkish beige<br>powder : very light beige<br>origin : mine near Buckingham, Papineau county, Québec<br><br>production process:<br>(followed from «grey [light blue tone]»)<br>2 g of orthoclase + 2 g of sodium carbonate / 0↑1700 °F + 1 h at 1700 °F<br>(followed at «greyish blue») |
| greenish blue | 1216 | mineral : copper<br>rock : reddish brown, with metallic luster<br>powder : reddish brown, with metallic luster<br>origin : unknown<br><br>production process:<br>rock entirely covered with 1000 ml acetic acid / |

| | | |
|---|---|---|
| slightly more intense than «intense greenish blue» | | natural drying / removal of the crystals formed at the surface of the rock (the colour of the crystals: pronounced emerald-green): 5 g + 25 ml ammonia / natural drying (intense greenish blue) / irradiated with gamma rays at 64.7 Mrad (followed at «dark emerald-green») |
| | | mineral : malachite<br>rock : ribboned variety of pronounced mint-green<br>powder : light and brilliant mint-green<br>origin : Katanga province, at 300 km from Lubumbachai, Zair, Africa |
| greenish blue considerably more intense than «intense greenish blue» | 1217 | production process:<br>2 g of malachite + 20 ml sulphuric acid / natural drying (intense indigo-blue) / irradiated with gamma rays at 64.7 Mrad (followed at «medium apple-green») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec |
| very intense greenish blue<br>↓ | 1218 | production process:<br>powder finely crushed and heated 0↑900 °F (beige): .50 g + 15 ml hydrochloric acid / soaking: 2 d. / slow drying on hot plate |
| very intense blue greenish blue (more blue) | 1219 | powder finely crushed and heated 0↑1000 °F (Naples yellow): .50 g + 15 ml hydrochloric acid / soaking: 2 d. / slow drying on hot plate (followed at «very intense blue») |
| very intense greenish blue | 1220 | production process:<br>powder finely crushed and heated 0↑1000 °F (Naples yellow ): .50 g + 15 ml sulphuric acid / soaking: 2 d. / slow drying on hot plate (followed at «very intense blue») |
| profound blue (emerald-green reflection) | 1220.1 | production process:<br>3 g of molybdenite finely crushed to pow der + 30 ml nitric acid / soaking: 3 d. / drying on hot plate (very intense blue): 1.50 g + 50 cc of transparent polyester resin + 1% of catalyst / manual grinding / moulding / deposited in an herme- |

| | | |
|---|---|---|
| | | tically closed container with a cover and put in a drying oven for plastic at 100 °F until hardened |
| very intense greenish blue | 1221 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>(followed from «greenish blue»)<br>1 g of wilsonite + 2 g of sodium carbonate / 1600 °F / 1 h |
| very intense and saturated greenish blue | 1222 | mineral : bornite<br>rock : reddish brown (with localized green and bluish green oxidation)<br>powder : reddish brown<br>origin : Lac Musset, Fosse du Labrador, Québec<br><br><u>production process:</u><br>12 g of bornite + 40 ml nitric acid / soaking: 3 h / separation of the 1st liquid and the solid / resting of the liquid during 5 d. / drying on sand bath / colour of the 1st liquid[226]<br>(followed at «very vivid and saturated blue») |
| dark greenish blue | 1223 | mineral : amethyst<br>rock : violet, translucid<br>powder : light grey (lilac tone)<br>origin : Thunderbay, Ontario<br><br><u>production process:</u><br>2 g of amethyst + 2 g of sodium carbonate / 0↑1800 °F + 1 h at 1800 °F (azure-blue) / irradiated with gamma rays at 64.7 Mrad<br>(followed at «blackish green») |
| dark greenish blue | 1224 | mineral : smaltite[25], variety of skutterudite<br>rock : dark iron-grey, with silver metallic brilliance<br>powder : dark grey<br>origin : Cobalt, Ontario<br><br><u>production process:</u><br>(followed from «intense royal-blue, dark and brilliant»)<br>1 g of smaltite + 2.50 g of sodium carbonate / 1900 °F / 30 min.[227]<br>(followed at «dark grey [with "dark royal-blue particles"]» and «dark blue [violet tone]») |

| | | |
|---|---|---|
| | | mineral : quartz<br>rock : light pink, translucid<br>powder : very light grey<br>origin : unknown<br><br>production process:<br>1 g of quartz + 1 g of sodium carbonate: |
| dark and vivid greenish blue | 1225 | 1600 °F / 1 h |
| ↓ | | |
| dark and vivid greenish blue | 1226 | 1700 °F / 1 h |
| peacock-blue[227a] | | |
| | | mineral : copper<br>rock : reddish brown, with metallic luster<br>powder : reddish brown, with metallic luster<br>origin : unknown<br><br>production process:<br>(followed from «bluish turquoise [accentuated green tone]») |
| peacock-blue | 1227 | 100 g of copper + 100 ml hydrochloric acid / soaking: 5 mo. / drying on hot plate (greenish turquoise fairly pronounced) / 0↑450 °f (grey [light blue tone]): .50 g + 5 ml ammonia / natural drying (followed at «greyish blue») |
| | | mineral : fluorine<br>rock : very pale yellow, translucid<br>powder : white (light yellow reflection)<br>origin : Ohio, United States<br><br>production process:<br>(followed from «dark yellow [brownish tone] or yellow amber») |
| peacock-blue | 1228 | rock irradiated with electrons at 155,082 rad (followed from «very intense peacock-blue») |
| | | mineral : spodumene<br>rock : pale green<br>powder : light grey, almost white<br>origin : Québec Lithium Co., Baraute, Abitibi, Québec<br><br>production process: |
| peacock-blue | 1229 | 2 g of spodumene + 2 g of sodium carbonate / 0↑1700 °F + 1 h at 1700 °F (emerald-green more intense than «light emerald-green») / irradiated with gamma rays at 64.7 Mrad |

| | | |
|---|---|---|
| | | (followed at «dark grass-green») |
| peacock-blue more intense and dark than «peacock-blue» | 1230 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br>production process:<br>powder finely crushed and heated 0↑1000 °F (Naples yellow): .50 g + 15 ml hydrochloric acid / soaking: 2 d. / slow drying on hot plate (very intense greenish blue): .15 g + 6 cc of polymer for concrete + 0.18 cc of catalyst + 1.50 thousandth of a g of cobalt 6% + 2 g of white cement / manual grinding / moulding / hardening (greenish peacock-blue) / irradiated with gamma rays at 18.85 Mrad |
| | | mineral : fluorine<br>rock : very light fluor-green (col d mint-green type), translucid<br>powder : very light grey<br>origin : Rogers Mine, Madoc, Ontario<br><br>production process:<br>rock irradiated with gamma rays at: |
| intense peacock-blue | 1231 | 5 Mrad |
| \| | | |
| peacock-blue more intense than «intense peacock-blue» | 1232 | 10 Mrad |
| \| | | |
| peacock-blue still more intense and near «royal-blue» | 1233 | 57.4 Mrad |
| \| | | |
| peacock-blue identical to the previous one | 1234 | 102.4 Mrad |
| \| | | |
| more intense peacock-blue | 1235 | 148.4 Mrad[230] |
| \| | | |
| peacock-blue still more | 1236 | 201.6 Mrad |

| | | |
|---|---|---|
| intense<br>↓<br>peacock-blue<br>still more<br>intense | 1237 | 247.6 Mrad |
| ↓<br>peacock-blue<br>more intense | 1238 | 287.3 Mrad[231] |
| ↓<br>peacock-blue<br>still more<br>intense | 1239 | 360 Mrad |
| ↓<br>peacock-blue<br>still more<br>intense | 1240 | 424.7 Mrad[232] |
| very intense peacock-blue | 1241 | mineral : fluorine<br>rock : very pale yellow, translucid<br>powder : white (light yellow reflection)<br>origin : Ohio, United States<br><br><u>production process:</u><br>(followed from «peacock-blue»)<br>rock irradiated with electrons at 164,800 rad[120]<br>(followed at «very strong and intense cobalt-blue») |
| very intense peacock-blue | 1242 | mineral : smaltite[25], variety of skutterudite<br>rock : dark iron-grey, with silver metallic brilliance<br>powder : dark grey<br>origin : Cobalt, Ontario<br><br><u>production process:</u><br>0↑1900 °F (dark brown): .30 g + 50 ml hydrochloric acid / soaking: 2 wk. / separation of the liquid and the solid / drying on hot plate / colour of the liquid[229] |
| peacock-blue (grey tone) | | |
| | | mineral : fluorine<br>rock : very light fluor-green (cold mint-green type), translucid<br>powder : very light grey<br>origin : Rogers Mine, Madoc, Ontario<br><br>mineral : cement[1138]<br>powder : white<br><br><u>production process:</u><br>(followed from «cobalt-blue») |

196

| | | |
|---|---|---|
| intense peacock-blue (light grey tone)<br>↓ | 1243 | 5 g of rocks of various sizes + 13.74 g of white cement[1138] + 6.50 cc of water / manual mixing / moulding / hardening / 0↑600 °F / cooling / irradiated with gamma rays at 18.85 Mrad[233] / colour of the rocks |
| intense peacock-blue (grey tone) | 1244 | 5 g of rocks of various sizes + 13.74 g of white cement[1138] + 6.50 cc of water / manual mixing / moulding / hardening / 0↑1300 °F / cooling / irradiated with gamma rays at 18.85 Mrad[234] / colour of the rocks (followed at «dark reddish violet») |

GREEN (BLUE TONE)

| colour obtained | number | mineral / production process |
|---|---|---|
| pale bluish green | 1245 | mineral : sodalite<br>rock : cold light blue<br>powder : light grey (light blue tone)<br>origin : Bancroft, Ontario<br><br>production process:<br>2 g of sodalite + 2 g of sodium carbonate / 0↑1500 °F + 45 min. at 1500 °F (light bluish green) / irradiated with electrons at 162,431 rad |
| bluish green darker than «pale bluish green» | 1246 | mineral : crocidolite<br>rock : dark greyish blue<br>powder : pale greyish blue<br>origin : Griqualand district, South Africa<br><br>production process:<br>(followed from «mint-green more pale than "light mint-green"»)<br>powder irradiated with gamma rays at 550.22 Mrad |
| very light bluish green | 1246.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi<br><br>production process:<br>powder finely crushed and heated 0↑900 °F (beige): .50 g + 15 ml hydrochloric acid / soaking: 2 d. / slow drying on hot plate (very intense greenish blue): .1 g + 50 cc of transparent polyester resin / manual grinding / deposited in an hermetically closed container with a cover / hardening |
| | | mineral : quartz<br>rock : light pink, translucid<br>powder : very light grey<br>origin : unknown |

198

| | | |
|---|---|---|
| very light bluish green ↓ | 1247 | production process: 4 g of quartz + 40 ml hydrochloric acid / soaking: 7 d. / separation of the liquid and the solid / natural drying (colour of the liquid: green) / irradiated with electrons at: 164,800 rad |
| very light bluish green | 1248 | 305,200 rad[73] |
| cold bluish green and more accentuated than «very light bluish green» | 1249 | mineral : apatite<br>rock : light grass-green (light blue and yellow tones), very slightly translucid<br>powder : very light grey (light green tone)<br>origin : region of Buckingham, Québec<br><br>production process: powder irradiated with neutrons during 2,000 seconds at $10^{12}$ neutrons / $cm^2$ / sec[241] |
| bluish green lighter and more vivid than «light bluish green» | 1250 | mineral : chrysocolla<br>rock : light greenish turquoise<br>powder : very light greenish turquoise<br>origin : Mexico<br><br>production process: 5 g of chrysocolla + 25 ml ammonia / natural drying (light bluish green) / irradiated with electrons at 302,831 rad[45] |
| light green (light blue tone) ↓ | 1251 | mineral : apophyllite<br>rock : milky white, translucid<br>powder : white<br>origin : Gaspé Copper Mine, Gaspé, Québec<br><br>production process: 2 g of apophyllite + 2 g of sodium carbonate: 0↑1500 °F + 1 h at 1500 °F |
| light green (light blue tone) ↓ | 1252 | 0↑1600 °F + 1 h at 1600 °F |
| light bluish green | 1253 | 0↑1700 °F + 1 h at 1700 °F (followed at «bluish turquoise») |
| | | mineral : copper concentrate (Cu-FeS) |

199

| | | |
|---|---|---|
| light green (light blue tone) | 1254 | powder : medium chocolate-brown (grey tone)<br>origin : Centre de recherche des Mines Noranda à Montréal, Québec<br><br>production process:<br>4 g of concentrate + 50 ml nitric acid / soaking: 2 h / separation of the liquid and the solid in 6 parts: a) pure liquid: natural drying[24]; b) pure liquid: drying on sand bath; c) liquid + a bit of solid: natural drying; d) solid: natural drying; e) solid: drying on sand bath; f) solid derived from c): natural drying / colour of e) solid: drying on sand bath[235] |
| light green (light blue tone) | 1255 | production process:<br>4 g of concentrate + 50 ml nitric acid / soaking: 4 wk. / separation of the liquid and the solid / drying on sand bath / colour of the solid[54] |
| light bluish green | 1256 | mineral : microcline<br>rock : white (grey reflection)<br>powder : white (grey reflection)<br>origin : Buckingham, Québec<br><br>production process:<br>(followed at «light green»)<br>2 g of microcline + 2 g of sodium carbonate / 0↑1500 °F + 1 h at 1500 °F<br>(followed at «blue») |
| light bluish green | 1257 | mineral : sodalite<br>rock : light cold blue<br>powder : light grey (light blue tone)<br>origin : Bancroft, Ontario<br><br>production process:<br>(followed at «light beige»)<br>2 g of sodalite + 2 g of sodium carbonate / 0↑1500 °F + 45 min. at 1500 °F<br>(followed at «dark indigo-blue») |
| bluish green more | 1258 | mineral : steatite<br>rock : light evergreen<br>powder : white<br>origin : East Broughton, Québec<br><br>production process:<br>2 g of steatite + 2 g of sodium carbonate / 0↑1900 °F + 1 h at 1900 °F (light bluish green) / irradiated with gamma rays at:<br>63.88 Mrad |

| | | |
|---|---|---|
| accentuated than «light bluish green» ↓ darker and more accentuated bluish green | 1259 | 423.88 Mrad[239] |
| bluish green considerably more accentuated than «light bluish green» | 1260 | mineral : apophyllite<br>rock : milky white, translucid<br>powder : white<br>origin : Gaspé Copper Mine, Gaspé, Québec<br><br>production process:<br>2 g of apophyllite + 2 g of sodium carbonate / 0↑1500 °F + 1 h at 1500 °F (light green [light blue tone]) / irradiated with gamma rays at 64.7 Mrad[239]<br>(followed at «mixture of particles: pinkish beige / grey / pale greenish grey / greyish brown») |
| green (light blue tone) colder and darker than «light bluish green» | 1261 | mineral : dolomite<br>rock : white (localized yellow reflection), crystalline and translucid<br>powder : white<br>origin : Bristol district, Pontiac county, Québec<br><br>production process:<br>2 g of dolomite + 2 g of sodium carbonate / 0↑1900 °F + 1 h at 1900 °F (apple-green a little more pronounced than «pale apple-green») / irradiated with gamma rays at 64.7 Mrad<br>(followed at «light grass-green») |
| light bluish green | 1262 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>2 g of analcime + 2 g of sodium carbonate:<br>0↑1500 °F + 1 h at 1500 °F |
| ↓ darker bluish green | 1263 | 0↑1600 °F + 1 h at 1600 °F<br>(followed at «dark greyish green») |
| light bluish green \| ↓ | 1264 | production process:<br>2 g of analcime + 2 g of potassium carbonate:<br>0↑1500 °F |

| | | |
|---|---|---|
| darker bluish green | 1265 | 0↑1600 °F<br>(followed at «dark greyish green») |
| | | mineral : apatite<br>rock : light grass-green (light blue and yellow tones), very slightly translucid<br>powder : very light grey (light green tone)<br>origin : region of Buckingham, Québec<br><br>production process:<br>rock irradiated with gamma rays at: |
| green (light bluish tone) more accentuated and darker than «light bluish green» | 1266 | 5 Mrad |
| | 1267 | 10 Mrad |
| ↓ darkens | 1268 | 57.4 Mrad |
| ↓ and ac- | 1269 | 65.704 Mrad |
| centuates itself | 1270 | 102.4 Mrad |
| ↓ | 1271 | 148.4 Mrad |
| ↓ | 1272 | 201.6 Mrad |
| ↓ | 1273 | 244.53 Mrad |
| ↓ | 1274 | 247.6 Mrad |
| ↓ | 1275 | 287.3 Mrad[243] |
| ↓ | 1276 | 360 Mrad |
| ↓ | 1277 | 425.704 Mrad |
| progressively | 1278 | 604.53 Mrad |
| | 1278.1 | mineral : actinolite<br>rock : cold and light evergreen<br>powder : light grey (light green tone)<br>origin : erratic bloc, found at Saint-Philémon near Dorchester, Québec<br><br>production process:<br>(followed from «intense green») |
| bluish green | 1279 | 2 g of actinolite + 2 g of sodium carbonate / 0↑1900 °F + 1 h at 1900 °F |
| | | mineral : fluorescent calcite<br>rock : white (localized grey and brown reflection), translucid<br>powder : white (yellow reflection)<br>origin : Bancroft, Ontario<br><br>production process: |
| bluish green | 1280 | 2 g of calcite + 2 g of sodium carbonate / 1700 °F / 1 h |
| | | mineral : malachite<br>rock : ribboned variety of pronounced mint- |

202

| | | |
|---|---|---|
| | | green<br>powder : light and brilliant mint-green<br>origin : Katanga provin ce, at 300 km from Lubumbachai, Zaïr, Africa<br><br>production process: |
| bluish green | 1281 | 2 g of malachite + 20 ml ether / natural drying |
| | | mineral : orthoclase<br>rock : light pinkish beige<br>powder : very light beige<br>origin : mine near Buckingham, Papineau county, Québec<br><br>production process:<br>(followed from «greyish blue») |
| bluish green | 1282 | 2 g of orthoclase + 2 g of sodium carbonate / 0↑1900 °F + 1 h at 1900 °F |
| | | mineral : fuel oil soot[86]<br>powder : profound brownish black<br>origin : boiler room of Laval University, city of Québec, Québec<br><br>production process: |
| bluish green | 1283 | 1 g of soot + 2.50 g of sodium carbonate / 1600 °F / 1 h[237] |
| | | mineral : apatite<br>rock : light grass-green (light blue and yellow tones), very slightly translucid<br>powder : very light grey (light green tone)<br>origin : region of Buckingham, Québec<br><br>production process:<br>granules[244] irradiated with gamma rays at: |
| bluish green | 1284 | 5 Mrad[245] |
| ↓ | | |
| bluish green more intense (accentuated blue tone) | 1285 | 10 Mrad |
| ↓ | | |
| darker bluish green | 1286 | 57.4 Mrad |
| ↓ | | |
| still darker bluish green | 1287 | 102.4 Mrad |
| ↓ | | |
| still darker bluish green | 1288 | 148.4 Mrad |
| ↓ | | |

| | | |
|---|---|---|
| bluish green still a little darker | 1289 | 201.6 Mrad |
| ↓ | | |
| bluish green still a little darker | 1290 | 247.6 Mrad (followed at «bluish green [brown tone]») |
| | | mineral : analcime<br>rock : white (grey reflection), crystalline and translucid<br>powder : light grey<br>origin : De-Mix quarry, North side of Mont Saint-Hilaire, Rouville county, Québec |
| | | production process:<br>2 g of analcime + 1 g of potassium carbonate: |
| bluish green | 1291 | 0↑1500 °F |
| \| | | |
| more intense bluish green | 1292 | 0↑1600 °F |
| \| | | |
| still more intense bluish green | 1293 | 0↑1700 °F |
| ↓ | | |
| still more intense bluish green | 1294 | 0↑1800 °F |
| | | mineral : steatite<br>rock : light evergreen<br>powder : white<br>origin : East Broughton, Québec |
| | | production process:<br>(followed from «green»)<br>2 g of steatite + 2 g of sodium carbonate: |
| bluish green | 1295 | 0↑1700 °F + 1 h at 1700 °F |
| \| | | |
| bluish green more accentuated | 1296 | 0↑1800 °F + 1 h at 1800 °F |
| ↓ | | |
| light bluish green | 1297 | 0↑1900 °F + 1 h at 1900 °F |
| | | mineral : copper<br>rock : reddish brown, with metallic luster<br>powder : reddish brown, with metallic luster<br>origin : unknown |
| | | production process: |
| bluish green lighter and more luminous than «intense bluish | 1298 | rock entirely covered with 1000 ml acetic acid / natural drying / removal of the crystals formed at the surface of the rock (the colour of the crystals: pronounced emerald-green): 5 g + 25 ml |

204

| | | |
|---|---|---|
| green» | | ammonia / natural drying (intense greenish blue) / irradiated with electrons at 302,831 rad[45] |
| green (light blue tone), lighter than «intense bluish green» | 1299 | mineral : chalcocite<br>rock : dark iron-grey (with localized turquoise oxidation)<br>powder : dark iron-grey<br>origin : Butte, Montana, United States<br><br>production process:<br>(followed from «greenish turquoise»)<br>4 g of chalcocite + 100 ml sulphuric acid / soaking: 2 wk. / separation of the liquid and the solid / drying on hot plate (colour of the solid: intense olive-green) / irradiated with electrons at 302,831 rad[45] |
| intense bluish green | 1300 | mineral : bornite<br>rock : reddish brown (with localized green and bluish green oxidation)<br>powder : reddish brown<br>origin : Lac Musset, Fosse du Labrador, Québec<br><br>production process:<br>1 g of bornite + 1 g of sodium carbonate / 1700 °F / 1 h[240] |
| intense bluish green | 1301 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «light greyish beige [pink reflection]»)<br>2 g of molybdenite + 2 g of sodium carbonate / 1500 °F / 45 min. |
| ↓ | | (followed from «green [between "phtalo-green" and "olive-green"]») |
| intense and dark bluish green | 1302 | 2 g of molybdenite + 2 g of sodium carbonate / 1700 °F / 1 h |
| bluish green more intense than «intense bluish green» | 1303 | production process:<br>2 g of molybdenite + 2 g of sodium carbonate / 1500 °F / 45 min. (intense bluish green) / irradiated with gamma rays at 64.7 Mrad<br>(followed at «blackish green») |
| | | mineral : chrysocolla |

205

| | | |
|---|---|---|
| very accentuated and luminous bluish green | 1304 | rock : light greenish turquoise<br>powder : very light greenish turquoise<br>origin : Mexico<br><br>production process:<br>powder irradiated with electrons at 302,831 rad[36] |
| dark bluish green more accentuated than «dark bluish green» | 1305 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br>production process:<br>powder finely crushed and heated 0↑900 °F (beige): .50 g + 15 ml hydrochloric acid / soaking: 2 d. / drying on hot plate (very intense greenish blue): .15 g + 6 cc of polymer for concrete + 0.18 cc of catalyst + 1.50 thousandth of a g of cobalt 6% + 2 g of white cement / manual grinding / moulding / hardening (dark bluish green) / irradiated with gamma rays at 18.85 Mrad[104] |
| bluish green (mossy texture), darker than «pronounced bluish green» | 1306 | mineral : copper<br>rock : reddish brown, with metallic luster<br>powder : reddish brown, with metallic luster<br>origin : unknown<br><br>production process:<br>(followed from «bluish turquoise more pale than "bluish turquoise"»)<br>100 g of copper+100 ml hydrochloric acid / soaking: 5 mo. / drying on hot plate (greenish turquoise fairly pronounced) / 0↑400 °F (greenish turquoise less pronounced than «greenish turquoise fairly pronounced»): .50 g + 5 ml ammonia / natural drying (bluish turquoise [accentuated green tone]) / irradiated with gamma rays at 423.88 Mrad |
| | | mineral : smaltite[25], variety of skutterudite<br>rock : dark iron-grey, with silver metallic brilliance<br>powder : dark grey<br>origin : Cobalt, Ontario |

| | | |
|---|---|---|
| dark green (blue reflection) | 1306.1 | <u>production process:</u><br>(followed from «cobalt-blue a little darker than "intense and saturated cobalt-blue"»)<br>1 g of smaltite + 6.50 of glass powder (spruce pine batch) / manual grinding / deposited on a ceramic plate at the state of a biscuit / heating in a furnace 0↑1000 °C in normal atmosphere / slow cooling in the furnace (intense and dark cobalt-blue) / irradiated with gamma rays at 7.41 Mrad |
| bluish green a little more p ale than «dark bluish green» | 1306.2 | mineral : zirconium oxide<br>powder : light beige<br>origin : Tam Ceramic Inc., Québec<br><br>vegetable : indigo<br>powder : very dark indigo-blue<br><br>animal : dried pork blood<br>powder : dark brown (orange-red tone)<br><br><u>production process:</u><br>0.14061 g of indigo irradiated with gamma rays at 2.26 Mrad + 0.14061 g of dried pork blood / irradiated with gamma rays at 2.26 Mrad + 0.14061 g of zirconium oxide / grinding |
| green lightly more pale than «very dark bluish green» | 1306.3 | vegetable : indigo<br>powder : very dark indigo-blue<br><br>animal : dried pork blood<br>powder : dark brown (orange-red tone)<br><br><u>production process:</u><br>0.14061 g of indigo irradiated with gamma rays at 2.26 Mrad + 0.14061 g of dried pork blood / irradiated with gamma rays at 2.26 Mrad + 0.28122 g of sodium carbonate / grinding |
| very dark bluish green | 1306.4 | vegetable : indigo<br>powder : very dark indigo-blue<br><br>animal : dried pork blood<br>powder : dark brown (orange-red tone)<br><br><u>production process:</u><br>0.14061 g of indigo irradiated with gamma rays at 2.26 Mrad + 0.14061 g of dried pork blood / irradiated with gamma rays at 2.26 Mrad / grinding |
| mixture of particles | | |
| | | mineral : bornite |

| | | |
|---|---|---|
| | | rock : reddish brown (with localized green and bluish green oxidation)<br>powder : reddish brown<br>origin : Lac Musset, Fosse du Labrador, Québec<br><br>production process:<br>(followed from «vivid phtalo[217a]-green») |
| bluish green / light and vivid apple-green | 1307 | 2 g of bornite + 10 ml hydrochloric acid + 15 ml nitric acid / soaking: 6 d. / separation of the liquid and the solid / natural drying / colour of the liquid[217,236]<br>(followed at «medium and very vivid emerald-blue» and «mixture of particles: light green / accentuated green») |
| bluish green (brown tone) | | |
| | | mineral : apatite<br>rock : light grass-green (light blue and yellow tones), very slightly translucid<br>powder : very light grey (light green tone)<br>origin : region of Buckingham, Québec<br><br>production process:<br>(followed from «bluish green»)<br>granules[244] irradiated with gamma rays at: |
| bluish green (brown tone) darker than «bluish green (brown tone)» | 1308 | 287.3 Mrad |
| ↓ | | |
| green (light blue and brown tones) still a little darker | 1309 | 360 Mrad |
| ↓ | | |
| green (light blue and brown tones) still a little darker | 1310 | 425.704 Mrad |
| ↓ | | |
| green (light blue and brown tones) still a little darker | 1311 | 604.53 Mrad |
| bluish green (grey tone) | | |
| | | mineral : tremolite<br>rock : medium brown (evergreen tone)<br>powder : greyish beige |

208

| | | |
|---|---|---|
| | | origin : Tetreault Mine, Montauban, Portneuf county, Québec<br><br>production process:<br>2 g of tremolite + 3 g of sodium carbonate / 0↑1500 °F + 30 min. at 1500 °F (followed at «beige [green tone]») |
| pale bluish green (grey tone) | 1312 | |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «mossy green»)<br>2 g of molybdenite + 2 g of sodium carbonate / 0↑900 °F + 1 h at 900 °F (light greenish yellow or light yellowish green) / irradiated with gamma rays at 423.88 Mrad[242] |
| bluish green (grey tone) | 1313 | |
| greenish turquoise | | |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «chamois [orange tone]»)<br>50 g of asbestos + 200 ml hydrochloric acid <u>or</u> asbestos entirely covered with hydrochloric acid / soaking: 1 wk. / drying on hot plate (vivid yellow): 1 g + 4 g of sodium carbonate / 0↑1500 °F (followed at «light greenish turquoise [light grey tone]») |
| very pale greenish turquoise | 1314 | |
| | | mineral : copper<br>rock : reddish brown, with metallic luster<br>powder : reddish brown, with metallic luster<br>origin : unknown<br><br>production process:<br>50 g of copper + 100 ml phosphoric acid / soaking: 3 wk. / drying on hot plate (still humid) / colour of the solid[242a] |
| very, very light greenish turquoise [almost white] | 1315 | |
| | | mineral : amazon stone<br>rock : light greenish turquoise, translucid<br>powder : white (turquoise reflection)<br>origin : unknown |

| | | |
|---|---|---|
| very light greenish turquoise | 1316 | <u>production process:</u> 4 g of amazon stone + 40 ml phosphoric acid / soaking: 2 wk. / drying on hot plate (still humid) / colour of the liquid |
| very light greenish turquoise | 1317 | <u>production process:</u> 4 g of amazon stone + 40 ml phosphoric acid / soaking: 2 wk. / drying on hot plate (still humid) / colour of the solid |
| greenish turquoise a little more pale than «light greenish turquoise» | 1318 | mineral : bornite<br>rock : reddish brown (with localized green and bluish green oxidation)<br>powder : reddish brown<br>origin : Lac Musset, Fosse du Labrador, Québec<br><br><u>production process:</u> 2 g of bornite + 25 ml hydrochloric acid / soaking: 6 d. / separation of the liquid and the solid / natural drying (colour of the liquid: light greenish turquoise) / irradiated with gamma rays at 65.65 Mrad (followed from «dark brownish grey») |
| light greenish turquoise | 1319 | mineral : asbestos*<br>rock : dark grey (green reflection)<br>powder : light grey (green reflection)<br>origin : Asbestos Corporation Ltd., Thetford Mines, Québec<br><br><u>production process:</u> (followed from «mixture of particles: orange / greenish turquoise») 50 g of asbestos + 200 ml hydrochloric acid <u>or</u> asbestos entirely covered with hydrochloric acid / soaking: 1 wk. / drying on hot plate (vivid yellow): 4 g + 3 g of sodium carbonate:<br>0↑1800 °F |
| ↓ more acute greenish turquoise | 1320 | 0↑1900 °F (followed at «mixture of particles: greenish turquoise / medium pastel greyish blue») |
| | | <u>production process:</u> (followed at «mixture of particles: orange / greenish turquoise») 50 g of asbestos + 200 ml hydrochloric acid <u>or</u> asbestos entirely covered with hydrochloric acid / soaking: 1 wk. / drying on hot plate (vivid yellow): 3 g + 4 g of sodium carbonate: |

210

| | | |
|---|---|---|
| light greenish turquoise | 1321 | 0↑1600 °F |
| ↓ | | |
| medium greenish turquoise | 1322 | 0↑1700 °F |
| ↓ | | |
| acute greenish turquoise | 1323 | 0↑1800 °F<br>(followed at «medium grass-green») |
| | | <u>production process:</u><br>(followed from «mixture of particles: vivid reddish orange / very light greenish turquoise»)<br>50 g of asbestos + 200 ml hydrochloric acid <u>or</u> asbestos entirely covered with hydrochloric acid / soaking: 1 wk. / drying on hot plate (vivid yellow): 2 g + 3 g of sodium carbonate: |
| light greenish turquoise | 1324 | 0↑1700 °F |
| ↓ | | |
| acute greenish turquoise | 1325 | 0↑1800 °F |
| ↓ | | |
| greenish turquoise still more acute | 1326 | 0↑1900 °F |
| | | mineral : copper<br>rock : reddish brown, with metallic luster<br>powder : reddish brown, with metallic luster<br>origin : unknown<br><br><u>production process:</u> |
| light greenish turquoise | 1327 | 50 g of copper + 100 ml phosphoric acid / soaking: 3 wk. / drying on hot plate (still humid) / colour of the liquid[246] |
| | | mineral : apatite<br>rock : dark grass-green (yellow tone), very slightly translucid<br>powder : powder filtered at 14 meshes: very, very light green; powder filtered neath 14 meshes: light grey (beige tone and greenish reflection)<br>origin : Ile Calumet, Pontiac county, Québec<br><br><u>production process:</u><br>«very, very light green» powder irradiated with gamma rays at: |
| light greenish turquoise | 1328 | 65.704 Mrad |
| ↓ | | |
| greenish turquoise considerably | 1329 | 244.53 Mrad[247] |

| | | |
|---|---|---|
| more accentuated | | (followed at «green strongly darker and accentuated») |
| light greenish turquoise | 1330 | mineral : graphite<br>rock : dark grey, with metallic brilliance<br>powder : dark grey, with metallic brilliance<br>origin : Grenville, Québec<br><br>production process:<br>1 g of graphite + 3 g of potassium carbonate / 0↑1500 °F[252] |
| light greenish turquoise | 1331 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br>production process:<br>powder finely crushed and heated 0↑1000 °F (Naples yellow): .50 g + 15 ml sulphuric acid / soaking: 2 d. / slow drying on hot plate (very intense greenish blue): .25 g + 6 cc of polymer for concrete + 0.18 cc of catalyst + 1.50 thousandth of a g of cobalt 6% + 2 g of white cement / manual grinding / moulding / hardening (dark mint-green [light greyish or brownish tone]) / irradiated with gamma rays at 18.85 Mrad[104] |
| light greenish turquoise | 1332<br>1333 | mineral : nickel sulphide<br>rock : dark grey<br>powder : dark grey<br>origin : Sudbury, Ontario<br><br>production process:<br>2 g of nickel sulphide + 25 ml nitric acid / boiling reaction as soon as the mineral is deposited in acid / at the end of the reaction, immediate separation of the liquid and the solid / natural drying / colour of the solid[54] |
| light greenish turquoise | 1334 | mineral : copper<br>rock : reddish brown, with metallic luster<br>powder : reddish brown, with metallic luster<br>origin : unknown<br><br>production process:<br>100 g of copper + 100 ml hydrochloric acid / soaking: 5 mo. / natural drying (mint-green [malachite-green type]): .50 g + 5 ml ammonia / natural |

| | | |
|---|---|---|
| ↓ | | drying<br><br>(followed at «greenish blue») |
| greener greenish turquoise<br>↓ | 1335 | 100 g of copper + 100 ml hydrochloric acid / soaking: 5 mo. / natural drying (mint-green [malachite-green type]) / 0↑350 °F (mint-green slightly darker than «mint-green [malachite-green type]): .50 g + 5 ml ammonia / natural drying |
| greenish turquoise still greener<br>↓ | 1336 | 100 g of copper + 100 ml hydrochloric acid / soaking: 5 mo. / natural drying (mint-green [malachite-green type]) / 0↑400 °F (mint-green slightly darker than at 0↑350 °F): .50 g + 5 ml ammonia / natural drying |
| greenish turquoise still a little greener | 1337 | 100 g of copper + 100 ml hydrochloric acid / soaking: 5 mo. / natural drying (mint-green [malachite-green type]) / 0↑450 °F (mint-green slightly darker than at 0↑400 °F): .50 g + 5 ml ammonia / natural drying<br>(followed at «greenish turquoise [light grey tone]») |
| light greenish turquoise | 1338 | mineral : bornite<br>rock : reddish brown (with localized green and bluish green oxidation)<br>powder : reddish brown<br>origin : Lac Musset, Fosse du Labrador, Québec<br><br><u>production process:</u><br>2 g of bornite + 25 ml hydrochloric acid / soaking: 6 d. / separation of the liquid and the solid / natural drying / colour of the liquid[248]<br>(followed at «light emerald-green» and «light yellowish green») |
| light and quite intense greenish turquoise | 1339 | mineral : chrysocolla<br>rock : light greenish turquoise<br>powder : very light greenish turquoise<br>origin : Mexico<br><br><u>production process:</u><br>(followed from «apple-green more intense than "apple-green"»)<br>2 g of chrysocolla + 25 ml hydrochloric acid / natural drying (colour of the liquid[409]: apple-green[24]) / irradiated with gamma rays at 424.7 Mrad[239,249] |
| light greenish | 1340 | <u>production process:</u><br>granules[250] irradiated with gamma rays at:<br>5 Mrad |

213

| | | |
|---|---|---|
| turquoise<br>↓ | | |
| greenish turquoise more acute<br>↓ | 1341 | 10 Mrad |
| greenish turquoise more acute<br>↓ | 1342 | 57.4 Mrad |
| greenish turquoise strongly more acute<br>↓ | 1343 | 64.7 Mrad |
| greenish turquoise very much more acute<br>↓ | 1344 | 102.4 Mrad |
| greenish turquoise very much more acute<br>↓ | 1345 | 148.4 Mrad |
| greenish turquoise still more acute<br>↓ | 1346 | 201.6 Mrad |
| greenish turquoise (accentuated green tone)<br>↓ | 1347 | 247.6 Mrad |
| darker greenish turquoise (accentuated green tone) | 1348 | 287.3 Mrad[251]<br>(followed at «phtalo-green[217a]») |
| light and vivid greenish turquoise | 1349 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>5 g of malachite + 25 ml ammonia / natural drying (mossy greenish turquoise) / irradiated with electrons at 302,831 rad[45] |
| light and vivid greenish turquoise | 1350 | mineral : copper<br>rock : reddish brown, with metallic luster<br>powder : reddish brown, with metallic luster<br>origin : unknown<br><br>production process:<br>100 g of copper + 100 ml hydrochloric acid / soaking: 5 mo. / drying on hot plate (fairly pronounced greenish turquoise) / irradiated with |

| | | |
|---|---|---|
| | | electrons at 302,831 rad[45] |
| greenish turquoise more intense than «light greenish turquoise»<br>↓<br>greenish turquoise still a little more darker and intense | 1351<br><br>1352 | mineral : amazonite<br>rock : light greenish turquoise<br>powder : white (turquoise reflection)<br>origin : Lac Sairs, Témiscamingue, Québec<br><br>production process:<br>rock irradiated with electrons at:<br>164,800 rad<br><br>305,200 rad[73] |
| greenish turquoise a little darker than «light greenish turquoise» | 1353 | mineral : amazon stone<br>rock : light greenish turquoise, translucid<br>powder : white (turquoise reflection)<br>origin : unknown<br><br>production process:<br>powder irradiated with electrons at 164,800 rad |
| greenish turquoise | 1354 | mineral : andulusite<br>rock : light brownish grey<br>powder : light grey<br>origin : Bimbowrie, South Australia<br><br>production process:<br>(followed from «grass-green more accentuated than "light grass-green"»)<br>2 g of andulusite + 2 g of sodium carbonate / 0↑1600 °F + 1 h at 1600 °F<br>(followed at «mixture of particles: greenish turquoise / olive-green») |
| greenish turquoise | 1355 | mineral : tremolite<br>rock : medium brown (evergreen tone)<br>powder : greyish beige<br>origin : Tetreault Mine, Montauban, Portneuf county, Québec<br><br>production process:<br>.25 g of tremolite + 1.25 g of sodium carbonate / 1700 °F / 1 h[253] |

| | | |
|---|---|---|
| | | (followed at «dark apple-green») |
| greenish turquoise | 1356 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml sulphuric acid / soaking: 2 wk. / separation of the liquid and the solid / drying on hot plate (colour of the solid: intense olive-green) / irradiated with electrons at 162,431 rad<br>(followed at «green [light blue tone] lighter than "intense bluish green"») |
| greenish turquoise | 1357 | mineral : copper<br>rock : reddish brown, with metallic luster<br>powder : reddish brown, with metallic luster<br>origin : unknown<br><br>production process:<br>(followed from «bluish turquoise»)<br>100 g of copper + 100 ml nitric acid / soaking: 5 mo. / natural drying (light bluish turquoise) / 0↑375 °F<br>(followed at «greyish green») |
| greenish turquoise | 1358 | mineral : copper concentrate (Cu-FeS)<br>powder : medium chocolate-brown (grey tone)<br>origin : Centre de recherche des Mines Noranda in Montréal, Québec<br><br>production process:<br>4 g of concentrate + 50 ml nitric acid / soaking: 4 wk. / separation of the liquid and the solid / drying on sand bath / colour of the liquid[254,449] |
| greenish turquoise | 1359 | mineral : chalcocite<br>rock : dark iron-grey (with localized turquoise oxidation)<br>powder : dark iron-grey<br>origin : Butte, Montana, United States<br><br>production process:<br>3 g of chalcocite + 20 ml of a cyanide[255] solution / natural drying / colour of the solid[347] |
| | | mineral : malachite<br>rock : ribboned variety of pronounced mint- |

| | | |
|---|---|---|
| greenish turquoise | 1360 | green<br>powder : light and brilliant mint-green<br>origin : Katanga province, at 300 km from Lubumbachai, Zair, Africa<br><br>production process :<br>(followed from «mossy greenish turquoise»)<br>0↑500 °F (mint-green more pronounced than «light mint-green»): .50 g + 5 ml ammonia / natural drying<br>(followed at «greenish turquoise [brown tone]») |
| greenish turquoise | 1361 | production process:<br>(followed from «mossy greenish turquoise lighter than "mossy greenish turquoise"»)<br>1 g of malachite + 3 ml ammonia / natural drying |
| light greenish turquoise | 1362 | 1 g of malachite + 4 ml ammonia / natural drying<br><br>(followed at «lichen-green»)<br><br>(followed at «lichen-green darker than "lichen-green"») |
| ↓<br>pronounced greenish turquoise | 1363 | 1 g of malachite + 25 ml ammonia / natural drying<br>(followed at «mossy greenish turquoise») |
| greenish turquoise a little more pale than «medium greenish turquoise» | 1364 | mineral : beryl<br>rock : very light yellowish green, slightly translucid<br>powder : white (green reflection)<br>origin : Lacorne district, Abitibi, Québec<br><br>production process:<br>2 g of beryl + 2 g of sodium carbonate / 0↑1900 °F + 1 h at 1900 °F (medium greenish turquoise [accentuated blue tone]) / irradiated with electrons at 302,831 rad[36] |
| greenish turquoise more pale than «medium greenish turquoise» | 1365 | mineral : bornite<br>rock : reddish brown (whith localized green and bluish green oxidation)<br>powder : reddish brown<br>origin : Lac Musset, Fosse du Labrador, Québec<br><br>production process:<br>2 g of bornite + 20 ml nitric acid + 5 ml hydrochloric acid / soaking: 6 d. / separation of the liquid and the solid / natural drying (colour of the solid: mixture of particles: medium phtalo- |

217

| | | |
|---|---|---|
| | | green[217a]) / intense greenish blue) / irradiated with gamma rays at 65.65 Mrad (followed at «apple-green [between "light apple-green" and "medium apple-green"]») |
| | | mineral : copper<br>rock : reddish brown, with metallic luster<br>powder : reddish brown, with metallic luster<br>origin : unknown<br><br>production process: |
| medium greenish turquoise (accentuated blue tone)<br>↓ | 1366 | 100 g of copper + 100 ml hydrochloric acid / soaking: 5 mo. / drying on hot plate (greenish turquoise fairly pronounced) / irradiated with gamma rays at 64.7 Mrad |
| greenish turquoise a little more pale than «medium greenish turquoise» | 1367 | 100 g of copper + 100 ml hydrochloric acid / soaking: 5 mo. / drying on hot plate (greenish turquoise fairly pronounced) / irradiated with gamma rays at 424.7 Mrad |
| | | mineral : agate<br>rock : grey (with a light orange circular area at the surface), slightly translucid<br>powder : very light grey<br>origin : unknown<br><br>production process: |
| medium greenish turquoise | 1368 | 3 g of agate + 40 ml nitric acid / soaking: 1 wk. / separation of the liquid and the solid / natural drying / colour of the liquid[160] |
| | | mineral : beryl<br>rock : very light yellowish green, slightly translucid<br>powder : white (green reflection)<br>origin : Lacorne district, Abitibi, Québec<br><br>production process:<br>(followed from «apple-green more acute than "pale apple-green"») |
| medium greenish turquoise (accentuated blue tone) | 1369 | 2 g of beryl + 2 g of sodium carbonate / 0↑1900 °F + 1 h at 1900 °F |
| | | mineral : bornite<br>rock : reddish brown (with localized green and bluish green oxidation)<br>powder : reddish brown<br>origin : Lac Musset, Fosse du Labrador, Québec |

| | | |
|---|---|---|
| | | production process: |
| medium and mat greenish turquoise | 1370 | 12 g of bornite + 40 ml nitric acid / soaking : 3 h / separation of the 1st liquid and the solid / addition to the same solid of 40 ml nitric acid / soaking: 1 d. / separation of the 2nd liquid and the solid / addition to still the same solid of 40 ml nitric acid / soaking: 5 d. / separation of the 3rd liquid and the solid / drying on sand bath / colour of the 3rd liquid[256] (followed at «pale greyish green [orange tone]») |
| | | mineral : copper<br>rock : reddish brown, with metallic luster<br>powder : reddish brown, with metallic luster<br>origin : unknown |
| | | production process: |
| greenish turquoise fairly pronounced | 1371 | 100 g of copper + 100 ml hydrochloric acid / soaking: 5 mo. / drying on hot plate |
| ↓ | | |
| greenish turquoise a little less pronounced than «greenish turquoise fairly pronounced» | 1372 | 100 g of copper + 100 ml hydrochloric acid / soaking: 5 mo. / drying on hot plate (fairly pronounced greenish turquoise) / 0↑350 °F |
| ↓ | | |
| greenish turquoise still a little less pronounced | 1373 | 100 g of copper + 100 ml hydrochloric acid / soaking: 5 mo. / drying on hot plate (greenish turquoise fairly pronounced) / 0↑400 °F (followed at «greenish turquoise [light grey tone]») |
| | | mineral : beryl<br>rock : very light yellowish green, slightly translucid<br>powder : white (green reflection)<br>origin : Lacorne district, Abitibi, Québec |
| | | production process: |
| greenish turquoise considerably darker and more accentuated than «greenish turquoise fairly pronounced» | 1374 | 2 g of beryl + 2 g of sodium carbonate / 0↑1900 °F + 1 h at 1900 °F (medium greenish turquoise [accentuated blue tone]) / irradiated with gamma rays at 423.88 Mrad[262] |
| | | mineral : Gaspé agate<br>rock : marbled nodule with shaded tints of white, pink and light grey, slightly translucid<br>powder : very light pinkish grey |

| | | |
|---|---|---|
| quite vivid greenish turquoise | 1375 | origin : Mont Lyall, Gaspésie, Québec<br><br>production process:<br>4 g of agate + 40 ml nitric acid / soaking: 1 wk. / separation of the liquid and the solid / natural drying / colour of the liquid[95,160] |
| vivid greenish turquoise<br>↓<br>greenish turquoise a little darker | 1376<br><br>1377 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «mixture of particles: orange-red / greenish turquoise»)<br>50 g of asbestos + 200 ml hydrochloric acid or asbestos entirely covered with hydrochloric acid / soaking: 1 wk. / drying on hot plate (vivid yellow): 2 g + 4 g of sodium carbonate:<br>0↑1700 °F<br><br>0↑1800 °F |
| accentuated greenish turquoise | 1378 | mineral : nickel sulphide<br>rock : dark grey<br>powder : dark grey<br>origin : Sudbury, Ontario<br><br>production process:<br>2 g of nickel sulphide + 25 ml of nitric acid / boiling reaction as soon as mineral is deposited in acid / immediate separation of the liquid from the solid as soon as the reaction is finished / natural drying / colour of the liquid[24,258] |
| accentuated greenish turquoise | 1379 | production process:<br>2 g of nickel sulphide + 20 ml nitric acid / soaking: 3 d. / drying on hot plate[24] |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «mixture of particles: greyish |

| | | |
|---|---|---|
| | | beige [orange-red tone] / greenish turquoise») /50 g of asbestos + 200 ml hydrochloric acid <u>or</u> asbestos entirely covered with hydrochloric acid / soaking: 1 wk. / drying on hot plate (vivid yellow): 4 g + 4 g of sodium carbonate: |
| accentuated greenish turquoise | 1380 | 0↑1600 °F |
| ↓ | | |
| greenish turquoise still more accentuated | 1381 | 0↑1700 °F |
| ↓ | | |
| greenish turquoise still more accentuated | 1382 | 0↑1800 °F |
| ↓ | | |
| acute greenish turquoise | 1383 | 0↑1900 °F (followed at «dark grass-green») |
| | | mineral : amazonite<br>rock : pronounced turquoise<br>powder : white (turquoise reflection)<br>origin : Lac Sairs, Témiscamingue, Abitibi, Québec |
| | | <u>production process:</u><br>rock irradiated with gamma rays at: |
| pronounced greenish turquoise | 1384 | 5 Mrad |
| | 1385 | 5.7 Mrad |
| ↓ | 1386 | 10 Mrad |
| ↓ | 1387 | 57.4 Mrad |
| ↓ which | 1388 | 64.7 Mrad |
| ↓ goes | 1389 | 102.4 Mrad |
| ↓ | 1390 | 148.4 Mrad |
| ↓ | 1391 | 201.6 Mrad |
| ↓ | 1392 | 247.6 Mrad |
| intensifying | 1393 | 287.3 Mrad |
| ↓ | 1394 | 360 Mrad |
| itself | 1395 | 424.7 Mrad[259] |
| | | mineral : smaltite[25], variety of skutterudite<br>rock : dark iron-grey, with silver metallic brilliance<br>powder : dark grey<br>origin : Cobalt, Ontario |
| | | <u>production process:</u> |
| pronounced greenish turquoise | 1396 | 3 g of smaltite + 80 ml hydrochloric acid / soaking: 2 wk. / separation of the liquid and the solid / drying on hot plate (colour of the solid: khaki-green) / irradiated with electrons at 162,431 rad |

| | | |
|---|---|---|
| pronounced greenish turquoise | 1397 | mineral : bornite<br>rock : reddish brown (with localized green and bluish green oxidation)<br>powder : reddish brown<br>origin : Lac Musset, Fosse du Labrador, Québec<br><br>production process:<br>(followed from «light azure-blue»)<br>1 g of bornite + 20 ml nitric acid / soaking: 6 d. / separation of the liquid and the solid / natural drying / colour of the liquid[183,260]<br>(followed at «intense bluish turquoise» and «pale apple-green») |
| pronounced greenish turquoise | 1398 | mineral : blue lace agate<br>rock : light blue (violet tone), slightly translucid<br>powder : very light grey<br>origin : Africa<br><br>production process:<br>3 g of agate + 40 ml nitric acid / soaking: 1 wk. / separation of the liquid and the solid / natural drying / colour of the liquid[160] |
| very pronounced iridescent greenish turquoise | 1399 | mineral : smaltite[25], variety of skutterudite<br>rock : dark iron-grey, with silver metallic brilliance<br>powder : dark grey<br>origin : Cobalt, Ontario<br><br>production process:<br>3 g of smaltite + 80 ml hydrochloric acid / soaking: 4 years / drying on hot plate / colour of the liquid[7,261] |
| dark greenish turquoise | 1400 | mineral : amazonite<br>rock : light greenish turquoise<br>powder : white (turquoise reflection)<br>origin : Lac Sairs, Témiscamingue, Québec<br><br>production process:<br>rock irradiated with gamma rays at:<br>63.984 Mrad |
| ↓ | | |
| darker greenish turquoise | 1401 | 122.984 Mrad<br>(followed at «very dark greenish turquoise [brown tone]») |
| | | mineral : fuel oil soot[86]<br>powder : profound brownish black<br>origin : boiler room of Laval University, city of Québec, Québec |

222

| | | |
|---|---|---|
| dark greenish turquoise | 1402 | <u>production process:</u><br>20 g of soot + 100 ml phosphoric acid / soaking: 3 wk. / separation of the liquid and the solid / drying on hot plate (still humid) / colour of the liquid[243] |
| mixture of particles | | |
| pale greenish turquoise / olive-green | 1403 | mineral : andulusite<br>rock : light brownish grey<br>powder : light grey<br>origin : Bimbowrie, South Australia<br><br><u>production process:</u><br>(followed from «greenish turquoise»)<br>2 g of andulusite + 2 g of sodium carbonate / 0↑1700 °F + 1 h at 1700 °F<br>(followed at «green») |
| | | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «mixture of particles: orange / greenish turquoise»)<br>50 g of asbestos + 200 ml hydrochloric acid <u>or</u> asbestos entirely covered with hydrochloric acid / soaking: 1 wk. / drying on hot plate (vivid yellow): 3 g + 2 g of sodium carbonate: |
| greenish turquoise / green [emerald-green type] ↓ | 1404 | 0↑1800 °F |
| greenish turquoise / apple-green ↓ | 1405 | 0↑1900 °F |
| greenish turquoise and apple-green equivalent to the previous ones | 1406 | 0↑2000 °F |
| greenish turquoise / medium pastel grey | 1407 | <u>production process:</u><br>(followed from «greenish turquoise more acute than "light greenish turquoise"»)<br>50 g of asbestos + 200 ml hydrochloric acid <u>or</u> asbestos entirely covered with hydrochloric acid / soaking: 1 wk. / drying on hot plate (vivid yellow): 4 g + 3 g of sodium carbonate / 0↑2000 °F |

| | | |
|---|---|---|
| | | mineral : bornite<br>rock : reddish brown (with localized green and bluish green oxidation)<br>powder : reddish brown<br>origin : Lac Musset, Fosse du Labrador, Québec |
| dark greenish turquoise / dark olive-green<br>↓ | 1408 | <u>production process:</u><br>1 g of bornite + 10 ml hydrochloric acid / soaking: 6 d. / separation of the liquid and the solid / natural drying / colour of the liquid[264]<br><br>(followed at «orange mat [green tone]») |
| dark and vivid greenish turquoise / dark and vivid olive-green<br>↓ | 1409 | 1 g of bornite + 20 ml hydrochloric acid / soaking: 6 d. / separation of the liquid and the solid / natural drying / colour of the liquid[64,379]<br><br>(followed at «medium and mat beige [orange tone]») |
| dark greenish turquoise / dark olive-green | 1410 | 1 g of bornite + 30 ml hydrochloric acid / soaking: 6 d. / separation of the liquid and the solid / natural drying / colour of the liquid[64]<br>(followed at «dark beige [orange tone]» and «light and very vivid azure-blue») |
| greenish turquoise (greyish beige tone) | | |
| | | mineral : amazonite<br>rock : greenish turquoise<br>powder : white (turquoise reflection)<br>origin : Lac Saint-Jean, Québec |
| pale and mat greenish turquoise (greyish beige tone) | 1411 | <u>production process:</u><br>(followed from «white [turquoise reflection]»)<br>powder irradiated with gamma rays at 424.7 Mrad |
| greenish turquoise (brown tone) | | |
| | | mineral : malachite<br>rock : ribboned variety of pronounced mint-green<br>powder : light and brilliant mint-green<br>origin : Katanga province, at 300 km from Lubumbachai, Zaïr, Africa |
| greenish turquoise (brown tone) | 1412 | <u>production process:</u><br>(followed from «greenish turquoise»)<br>0↑600 °F (mint-green [brown tone]): .50 g + 5 ml ammonia / natural drying<br>(followed at «brown») |

| | | |
|---|---|---|
| | | mineral : amazon stone<br>rock : light greenish turquoise, translucid<br>powder : white (turquoise reflection)<br>origin : unknown |
| | | production process:<br>rock irradiated with gamma rays at: |
| greenish turquoise (darkens progressively by acquiring a light brown tone) | 1413 | 5 Mrad |
| | 1414 | 10 Mrad |
| | 1415 | 57.4 Mrad |
| | 1416 | 64.7 Mrad |
| | 1417 | 102.4 Mrad |
| | 1418 | 148.4 Mrad |
| | 1419 | 201.6 Mrad |
| | 1420 | 247.6 Mrad |
| | 1421 | 287.3 Mrad |
| | 1422 | 360 Mrad |
| ↓ | 1423 | 424.7 Mrad |
| | | mineral : amazonite<br>rock : light greenish turquoise<br>powder : white (turquoise reflection)<br>origin : Lac Sairs, Témiscamingue, Québec |
| | | production process:<br>(followed from «greenish turquoise darker than "dark greenish turquoise"») |
| very dark greenish turquoise (brown tone) | 1424 | rock irradiated with gamma rays at 424.984 Mrad |
| greenish turquoise (grey tone) | | |
| | | mineral : asbestos[4]<br>rock : dark grey (green reflection)<br>powder : light grey (green reflection)<br>origin : Asbestos Corporation Ltd., Thetford Mines, Québec |
| | | production process:<br>(followed from «mixture of particles: orange rust / very pale greenish turquoise [grey tone]»)<br>50 g of asbestos + 200 ml hydrochloric acid or asbestos entirely covered with hydrochloric acid / soaking: 1 wk. / drying on hot plate (vivid yellow): 1 g + 3 g of sodium carbonate: |
| very, very pale greenish turquoise (grey tone) | 1425 | 0↑1600 °F |
| ↓ | | |
| light greenish turquoise (grey | 1426 | 0↑1700 °F |

| | | |
|---|---|---|
| tone)<br>↓<br>greenish turquoise a little more acute (grey tone) | 1427 | 0↑1800 °F |
| | | production process:<br>(followed from «very pale greenish turquoise»)<br>50 g of asbestos + 200 ml hydrochloric acid or asbestos entirely covered with hydrochloric acid / soaking: 1 wk. / drying on hot plate (vivid yellow): 1 g + 4 g of sodium carbonate: |
| light greenish turquoise (light grey tone)<br>↓ | 1428 | 0↑1600 °F |
| greenish turquoise a little darker<br>↓ | 1429 | 0↑1700 °F |
| greenish turquoise equivalent to the previous one | 1430 | 0↑1800 °F |
| | | mineral : copper<br>rock : reddish brown, with metallic luster<br>powder : reddish brown, with metallic luster<br>origin : unknown<br><br>production process:<br>(followed from «light greenish turquoise») |
| greenish turquoise (light grey tone)<br>↓ | 1431 | 100 g of copper + 100 ml hydrochloric acid / soaking: 5 mo. / natural drying (mint-green [malachite-green type]) / 0↑500 °F (mint-green lightly darker than at 0↑450 °F): .50 g + 5 ml ammonia / natural drying |
| greenish turquoise (light grey tone) | 1432 | 100 g of copper + 100 ml hydrochloric acid / soaking: 5 mo. / natural drying (mint-green [malachite-green type]) / 0↑600 °F (mint-green lightly darker than at 0↑500 °F): .50 g + 5 ml ammonia / natural drying<br>(followed at «grey») |
| | | production process:<br>(followed at «greenish turquoise a little less pronounced than "greenish turquoise fairly pronounced"») |
| greenish turquoise (light grey tone) | 1433 | 100 g of copper + 100 ml hydrochloric acid / soaking: 5 mo. / drying on hot plate (greenish turquoise fairly pronounced) / 0↑425 °F<br>(followed at «grey [light blue tone]») |
| mossy greenish turquoise | | |

| | | |
|---|---|---|
| | | mineral : malachite<br>rock : ribboned variety of pronounced mint-mint green<br>powder : light and brilliant mint-green<br>origin : Katanga province, at 300 km from Lubumbachai, Zair, Africa |
| mossy greenish turquoise lighter and more luminous than «light and brilliant mossy greenish turquoise» | 1434 | production process:<br>1 g of malachite + 2 ml ammonia / natural drying (mossy greenish turquoise lighter than «mossy greenish turquoise») / irradiated with electrons at 302,831 rad[45] |
| mossy greenish turquoise greener and a little more accentuated than «light and brilliant mossy greenish turquoise» | 1435 | production process:<br>1 g of malachite + 2 ml ammonia / natural drying (mossy greenish turquoise lighter than «mossy greenish turquoise») / irradiated with gamma rays at 64.7 Mrad<br><br>(followed at «very dark iron-grey [light brown tone]») |
| mossy greenish turquoise | 1436 | production process:<br>.50 g of malachite + 5 ml ammonia / natural drying<br><br>(followed at «greenish turquoise») |
| ↓ | | |
| mossy greenish turquoise | 1437 | 1 g of malachite + 1 ml ammonia / natural drying |
| ↓ | | |
| mossy greenish turquoise lighter than «mossy greenish turquoise» | 1438 | 1 g of malachite + 2 ml ammonia / natural drying<br><br>(followed at «greenish turquoise»)<br><br>(followed at «pronounced greenish turquoise») |
| ↓ | | |
| mossy greenish turquoise | 1439 | 5 g of malachite + 25 ml ammonia / natural drying |

GREEN

| colour obtained | number | mineral / production process |
|---|---|---|
| | 1440 | mineral : almandite<br>rock : dark brownish red<br>powder : medium brownish red<br>origin : Gore Mountain, Warren County, New York State |
| very, very pale green [almost white] | 1441 | production process:<br>4 g of almandite + 50 ml sulphuric acid / soaking: 2 wk. / separation of the liquid and the solid / drying on hot plate / colour of the liquid (followed at «grey») |
| | 1442 | mineral : granite gneiss<br>rock : reddish beige<br>powder : medium pink (light brown tone)<br>origin : Lac Beauport, region of the city of Québec, Québec |
| very, very pale green | 1443 | production process:<br>(followed from «phtalo-green»)<br>2 g of gneiss + 2 g of sodium carbonate / 0↑1700 °F + 1 h at 1700 °F (pale emerald-green) / irradiated with electrons at 302,831 rad[45] |
| | | mineral : asbestos[4]<br>rock : dark grey (green reflection)<br>powder : light grey (green reflection)<br>origin : Asbestos Corporation Ltd., Thetford Mines, Québec |
| pale green | 1444 | production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) / 0↑1900 °F (green) / irradiated with gamma rays at 65.65 Mrad (followed at «light creamy beige») |
| | | mineral : crocidolite |

| | | |
|---|---|---|
| pale green | 1445 | rock : dark greyish blue<br>powder : pale greyish blue<br>origin : Griqualand district, South Africa<br><br><u>production process:</u><br>(followed from «pale greenish blue»)<br>rock irradiated with gamma rays at 615.924 Mrad[67.69] |
| pale green | 1446 | mineral : bornite<br>rock : reddish brown (with localized green and bluish green oxidation)<br>powder : reddish brown<br>origin : Lac Musset, Fosse du Labrador, Québec<br><br><u>production process:</u><br>1500 °F / 1 h (medium reddish brown): 1 g + 40 ml nitric acid / soaking: 14 d. / separation of the liquid and the solid / natural drying / colour of the solid[52] |
| | 1447 | mineral : chrome<br>powder : light grey, with metallic brilliance<br><br>mineral : cement[459]<br>powder : grey<br>origin : Lafarge Canada Inc., Montréal, Québec |
| pale green | 1448 | <u>production process:</u><br>(followed from «pale yellow»)<br>1 g of chrome + 27.40 g of cement + 13 cc of water / manual grinding / moulding / hardening / 0↑1500 °F[266]<br>(followed at «grass-green») |
| pale green | 1449 | mineral : chrome<br>powder : light grey, with metallicbrilliance<br><br>mineral : cement[1138]<br>powder : white<br><br><u>production process:</u><br>(followed at «grey [beige tone]»)<br>1 g of chrome + 27.40 g of cement + 13 cc of water / manual grinding / moulding / hardening:<br>0↑1400 °F |
| pale green | 1450 | 0↑1500 °F |
| pale green | 1451 | 0↑1600 °F |
| green a little | 1452 | 0↑1700 °F |

229

| | | |
|---|---|---|
| more accentuated than «pale green» | | |
| green a little more accentuated | 1453 | 0↑1800 °F |
| green much more accentuated | 1454 | 0↑1850 °F[1139] |
| green still more accentuated | 1455 | 0↑1900 °F[266] |
| pale french green | 1456 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>2 g of wilsonite + 2 g of sodium carbonate / 0↑1600 °F + 1 h at 1600 °F (light azure-blue) / irradiated with gamma rays at 190.22 Mrad (followed from «grey [beige tone]») |
| very, very light green [almost white] | 1457 | mineral : copper<br>rock : reddish brown, with metallic luster<br>powder : reddish brown, with metallic luster<br>origin : unknown<br><br>production process:<br>100 g of copper+100 ml nitric acid / soaking: 5 mo. / natural drying (light bluish turquoise): 2 g + 20 ml phosphoric acid / soaking: 3 d. / drying on hot plate (still humid) / colour of the liquid[267] (followed at «very light bluish turquoise [almost white]») |
| very, very light green | 1458 | mineral : apatite<br>rock : pale brownish green<br>powder : very light greyish green<br>origin : Black Lake, Thetford county, Québec<br><br>production process:<br>2 g of apatite + 25 ml nitric acid / soaking: 24 h / drying on hot plate[24] (very light green) / irradiated with electrons at 162,431 rad |
| | | mineral : beryl<br>rock : light blue (near turquoise), slightly |

| | | |
|---|---|---|
| very, very light green | 1459 | translucid<br>powder : light grey<br>origin : Lacorne district, Abitibi, Québec<br><br><u>production process:</u><br>1600 °F / 1 h (white [bluish grey reflection]) / rock irradiated with gamma rays at 65.65 Mrad (followed at «light greyish beige [green tone]») |
| very, very light green | 1460 | mineral : stilbite<br>rock : white (honey reflection)<br>powder : white (honey reflection)<br>origin : Lac d'amiante Mine, Black Lake, Québec<br><br><u>production process:</u><br>3 g of stilbite + 40 ml nitric acid / natural drying (white [green reflection]) / irradiated with gamma rays at 64.7 Mrad<br>(followed at «lemon-yellow») |
| very, very light green | 1461 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>2 g of wilsonite + 2 g of potassium carbonate / 0↑1500 °F<br>(followed at «light azure-blue ») |
| | | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br><u>production process:</u><br>«very, very light green» powder irradiated with electrons at: |
| green a little more accentuated than «very, very light green»<br>↓ | 1462 | 162,431 rad |
| green still a little more accentuated | 1463 | 302,831 rad[45] |

| | | |
|---|---|---|
| very light green | 1464 | mineral : asbestos[4]<br>rock : dark grey (green reflection)<br>powder : light grey (green reflection)<br>origin : Asbestos Corporation Ltd., Thetford Mines, Québec<br><br>production process:<br>15 g of asbestos + 100 ml phosphoric acid / soaking: 3 wk. / separation of the liquid and the solid / drying on hot plate (still humid) / colour of the liquid[7] |
| very light green | 1465 | mineral : apatite<br>rock : pale brownish green<br>powder : very light greyish green<br>origin : Black Lake, Thetford county, Québec<br><br>production process:<br>2 g of apatite + 25 ml nitric acid / soaking: 24 h / drying on hot plate[24] |
| very light green | 1466 | mineral : beryl<br>rock : light blue (near turquoise), slightly translucid<br>powder : light grey<br>origin : Lacorne district, Abitibi, Québec<br><br>production process:<br>1600 °F / 1 h (very light bluish grey) / rock irradiated with gamma rays at 65.65 Mrad (followed at «light beige [green reflection]») |
| very light green<br>↓ | 1467 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «light yellow [light green tone]» and «light green [near beige]»)<br>1.50 g of calcite + .50 g of chrome / grinded and moistened with water until it has the consistency of a paste / 1400 °F / 1 h[294,319] |
| very light green | 1468 | (followed at «light grass-green [light yellow tone]»)<br>1.50 g of calcite + .50 g of chrome / grinded and moistened with water until it has the consistency |

| | | |
|---|---|---|
| | | of a paste / 1500 °F / 1 h[294,319] |
| very light green | 1469 | mineral : chalcocite<br>rock : dark iron-grey (with localized turquoise oxidation)<br>powder : dark iron-grey<br>origin : Butte, Montana, United States<br><br><u>production process:</u><br>(followed at «greenish blue» and «dark green»)<br>0↑1900 °F (dark iron-grey): 1 g + 80 ml nitric acid / soaking: 2 wk. / separation of the liquid and the solid / desiccation / colour of the solid[268] |
| very light green | 1470 | mineral : copper<br>rock : reddish brown, with metallic luster<br>powder : reddish brown, with metallic luster<br>origin : unknown<br><br><u>production process:</u><br>(followed at «green»)<br>100 g of copper + 100 ml nitric acid / soaking: 5 mo. / natural drying (light bluish turquoise): 50 g + 100 ml phosphoric acid / soaking: 3 wk. / drying on hot plate (still humid) / colour of the solid[59] |
| green strongly more accentuated than «very light green» | 1471 | mineral : beryl<br>rock : very light yellowish green, slightly translucid<br>powder : white (greenish reflection)<br>origin : Lacorne district, Abitibi, Québec<br><br><u>production process:</u><br>rock irradiated with gamma rays at 244.53 Mrad[288]<br><br>(followed at «very pronounced greenish yellow [yellow mustard type]») |
| green darker than «very light green» | 1472 | mineral : chrysocolla<br>rock : light greenish turquoise<br>powder : very light greenish turquoise<br>origin : Mexico<br><br><u>production process:</u><br>450 °F / 10 min. |
| | | mineral : bornite<br>rock : reddish brown (with localized green and bluish green oxidation) |

| | | |
|---|---|---|
| green a little lighter and more luminous than «light green» | 1473 | powder : reddish brown<br>origin : Lac Musset, Fosse du Labrador, Québec<br><br>production process:<br>2 g of bornite + 15 ml nitric acid + 10 ml hydrochloric acid / soaking: 6 d. / separation of the liquid and the solid / natural drying (colour of the solid: mixture of particles[24]: light green and accentuated green) / irradiated with gamma rays at 65.65 Mrad<br>(followed at «medium brownish grey [green reflection]») |
| light green lighter than «light green» | 1474 | mineral : amazonite<br>rock : greenish turquoise<br>powder : white (turquoise reflection)<br>origin : Lac Saint-Jean, Québec<br><br>production process:<br>2 g of amazonite + 20 ml nitric acid / soaking: 3 d. / drying on hot plate |
| light green | 1475 | mineral : blue lace agate<br>rock : light blue (violet tone), slightly translucid<br>powder : very light grey<br>origin : Africa<br><br>production process:<br>3 g of agate + 40 ml phosphoric acid / soaking: 2 wk. / drying on hot plate (still humid) / colour of the liquid[7] |
| light green | 1475.1 | mineral : chrysocolla<br>rock : light greenish turquoise<br>powder : very light greenish turquoise<br>origin : Mexico<br><br>production process:<br>1 g of chrysocolla +.25 ml ammonia / natural drying (bluish green): .2 g + 50 cc of transparent polyester resin + 1% of catalyst / manual grinding / deposited in an hermetically closed container with a cover and put in a drying oven for plastic at 100 °F till hardened |
| | | mineral : asbestos[4]<br>rock : dark grey (green reflection)<br>powder : light grey (green reflection)<br>origin : Asbestos Corporation Ltd., Thetford Mines, Québec |

234

| | | |
|---|---|---|
| | | <u>production process:</u><br>(followed from «mixture of particles: light green / beige») |
| light green | 1476 | .50 g of asbestos + .50 g of sodium carbonate / 0↑1800 °F |
| ↓ | | |
| light green | 1477 | .50 g of asbestos + .50 g of sodium carbonate / 0↑1900 °F |
| | | mineral : copper arsenate<br>powder : light greenish blue<br>origin : City Chemical Corporation, New York, United States |
| light green | 1478 | <u>production process:</u><br>irradiated with gamma rays at 602.804 Mrad[214]<br>(followed at «olive-green») |
| | | mineral : beryl<br>rock : very light greenish blue, slightly translucid<br>origin : Brassard district, Berthier county, Québec |
| light green | 1479 | <u>production process:</u><br>rock irradiated with gamma rays at 63.984 Mrad (followed at «olive-green more accentuated than "light olive-green"») |
| | | mineral : beryl<br>rock : light blue, slightly translucid<br>powder : light grey<br>origin : Abitibi, Québec |
| light green | 1480 | <u>production process:</u><br>rock irradiated with gamma rays at 63.984 Mrad (followed at «olive-green») |
| | | mineral : bornite<br>rock : reddish brown (with localized green and bluish green oxidation)<br>powder : reddish brown<br>origin : Lac Musset, Fosse du Labrador, Québec |
| light green | 1481 | <u>production process:</u><br>1500 °F / 1 h (medium reddish brown): 1 g + 40 ml hydrochloric acid / soaking: 14 d. / separation of the liquid and the solid / natural drying / colour of the solid[271] |
| | 1482 | mineral : chalcopyrite<br>rock : brass-yellow, with metalic luster<br>powder : dark grey (with golden particles) |

| | | |
|---|---|---|
| | | origin : Noranda Mines, Noranda, Abitibi, Québec<br><br>production process: |
| light green | 1483 | 2 g of chalcopyrite + 20 ml phosphoric acid / soaking: 3 d. / drying on hot plate (still humid) / colour of the liquid[7]<br>(followed at «dark grey») |
| | 1484 | mineral : coal<br>rock : black<br>powder : brownish black<br>origin : bank of St.-Lawrence river at the city of Québec, Québec<br><br>production process:<br>(followed from «beige») |
| light green | 1485 | 2 g of coal + 2 g of sodium carbonate / 0↑1500 °F + 30 min. at 1500 °F<br>(followed at «mint-green [malachite-green type]») |
| | 1486 | mineral : cement[249]<br>powder : medium brownish grey<br>origin : CALCO, Charlesbourg, Québec<br><br>mineral : chrome<br>powder : light grey, with metallic brilliance<br><br>production process:<br>(followed from «light beige [light green tone]») |
| light green<br>↓ | 1487 | 1.50 g of cement + .15 g of chrome / 1525 °F / 1 h<br><br>(followed at «light grass-green»)<br><br>(followed at «light grass-green») |
| more pronounced green | 1488 | 1.50 g of cement + .50 g of chrome / 1600 °F / 1 h<br>(followed at «light yellowish green») |
| | | mineral : copper<br>rock : reddish brown, with metallic luster<br>powder : reddish brown, with metallic luster<br>origin : unknown<br><br>production process: |
| light green | 1489 | 100 g of copper + 100 ml hydrochloric acid / soaking: 5 mo. / natural drying (mint-green [malachite-green type]): 2 g + 20 ml phosphoric acid / soaking: 3 d. / drying on hot plate (still humid) / colour of the liquid[7] |

| | | |
|---|---|---|
| | | (followed at «light grey») |
| light green | 1490 | production process:<br>100 g of copper + 100 ml hydrochloric acid / soaking: 5 mo. / drying on hot plate (greenish turquoise fairly pronounced): 2 g + 20 ml phosphoric acid / soaking: 3 d. / drying on hot plate (still humid) / colour of the liquid[273]<br>(followed at «bluish turquoise») |
| | 1491 | mineral : goethite[106]<br>powder : orange rust<br>origin : Red Mill, in the suburbs of Cap-de-la-Madeleine, Québec<br><br>mineral : feldspar<br>rock : opaque white<br>powder : white<br>origin : Baraute, Abitibi, Québec<br><br>mineral : zirconium silicate<br>powder : white (very light yellow tone)<br>origin : Sial Company, Québec |
| light green | 1492 | production process:<br>(followed from «dark chocolate brown [red tone and violet reflection]»)<br>0↑1400 °F / slow cooling in furnace (indian red[107]): 1 g + 1 g of feldspar (dark reddish brown [near Burgundy-red]): .50 g + .50 g of sodium carbonate + .50 g of zirconium silicate / 1700 °F / 1 h[274] |
| | | mineral : labrador<br>rock : blackish grey<br>powder : medium grey<br>origin : Lac Saint-Jean, Québec<br><br>production process:<br>(followed from «dark orange rust [red tone]»)<br>2 g of labrador + 2 g of sodium carbonate: |
| light green | 1493 | 0↑1500 °F + 40 min. at 1500 °F |
| \| | | |
| light green more accentuated | 1494 | 0↑1500 °F + 55 min. at 1500 °F |
| \| | | |
| light green still more accentuated | 1495 | 0↑1500 °F + 1 h at 1500 °F |
| ↓ | | |
| light green iden- | 1496 | 0↑1500 °F + 90 min. at 1500 °F |

| | | |
|---|---|---|
| tical to the previous one | | (followed at «light olive-green») |
| light green | 1497 | mineral : microcline<br>rock : white (grey reflection)<br>powder : white (grey reflection)<br>origin : Buckingham, Québec<br><br>production process:<br>(followed from «white [grey reflection]»)<br>2 g of microcline + 2 g of sodium carbonate / 0↑1500 °F + 30 min. at 1500 °F<br>(followed at «light bluish green») |
| light green | 1498 | production process:<br>rock entirely covered with 20 ml hydrochloric acid / soaking: 2 wk. / irradiated with gamma rays at 5.7 Mrad / drying on sand bath, completed on hot plate[275] |
| light green | 1499 | mineral : quartz - mica[96]<br>powder : light cream (light yellow tone)<br>origin : small copper and nickel deposit in the South-Western area of a mass of serpentinite at 3 km at the West of Saint-Fabien-de-Panet, Québec<br><br>production process:<br>(followed from «beige [orange tone]»)<br>2 g of quartz - mica + 2 g of sodium carbonate / 0↑1800 °F + 1 h at 1800 °F |
| light green | 1500<br>1501 | mineral : pyrrhotite[276]<br>rock : dark greyish brown, with golden yellow metallic brilliance<br>powder : dark grey<br>origin : Inco Co., Sudbury, Ontario<br><br>production process:<br>4 g of pyrrhotite + 20 ml phosphoric acid / soaking: 3 wk. / drying on hot plate (still humid) / colour of the liquid[7] |
| light green | 1503 | mineral : quartz<br>rock : light pink, translucid<br>powder : very light grey<br>origin : unknown<br><br>production process:<br>4 g of quartz + 40 ml hydrochloric acid / soaking: 7 d. / separation of the liquid and the solid / natural drying / colour of the solid[59,277] |

| | | |
|---|---|---|
| light green | 1504 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 mo. / natural drying / colour of the solid[279] |
| | | mineral : asbestos[4]<br>rock : dark grey (green reflection)<br>powder : light grey (green reflection)<br>origin : Asbestos Corporation Ltd., Thetford Mines, Québec<br><br>production process: |
| intense light green ↓ | 1505 | 3 g of asbestos + 4 g of sodium carbonate / 0↑1800 °F |
| intense light green | 1506 | 3 g of asbestos + 4 g of sodium carbonate / 0↑1900 °F |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «light green [light beige tone]»)<br>2 g of wilsonite + 2 g of sodium carbonate: |
| accentuated light green ↓ | 1507 | 0↑1500 °F + 30 min. at 1500 °F |
| green still more accentuated ↓ | 1508 | 0↑1500 °F + 45 min. at 1500 °F |
| green still more accentuated | 1509 | 0↑1500 °F + 1 h at 1500 °F<br>(followed at «azure-blue») |
| | | mineral : chrysocolla<br>rock : light greenish turquoise<br>powder : very light greenish turquoise<br>origin : Mexico<br><br>production process: |
| green a little more accentuated than «light green» | 1510 | 5 g of chrysocolla + 25 ml ammonia / natural drying (light bluish green) / irradiated with gamma rays at 64.7 Mrad<br>(followed at «medium and intense green [olive- |

239

| | | |
|---|---|---|
| | | green type]») |
| green more accentuated than «light green» | 1511 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 mo. / natural drying (colour of the solid: light green) / irradiated with electrons at 162,431 rad |
| green darker than «light green» | 1512 | mineral : bornite<br>rock : reddish brown (with localized green and bluish green oxidation)<br>powder : reddish brown<br>origin : Lac Musset, Fosse du Labrador, Québec<br><br>production process:<br>1500 °F / 1 h (medium reddish brown): 1 g + 40 ml hydrochloric acid / soaking: 14 d. / separation of the liquid and the solid / drying on hot plate (colour of the solid: light green) / irradiated with electrons at 164,800 rad |
| green darker than «light green» | 1513 | mineral : chrysocolla<br>rock : light greenish turquoise<br>powder : very light greenish turquoise<br>origin : Mexico<br><br>production process:<br>1 g of chrysocolla + 4 ml ammonia / natural drying (bluish green): .2 g + 50 cc of transparent polyester resin + 1% of catalyst / manual grinding / moulding / hardening (light mint-green or cold and light evergreen) / irradiated with electrons at 155,082 rad<br>(followed at «mint-green [light yellow tone]») |
| green (with brown particles) | 1514 | mineral : asbestos*<br>rock : dark grey (green reflection)<br>powder : light grey (green reflection)<br>origin : Asbestos Corporation Ltd., Thetford Mines, Québec<br><br>production process:<br>(followed from «light khaki-green»)<br>2 g of asbestos + 2 g of sodium carbonate / 1900 °F / 1 h |

240

| | | |
|---|---|---|
| streaks: green / dark brown (orange tone) / medium caramel (orange tone) | 1514.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>1 g of molybdenite + 6.50 g of glass powder (spruce pine batch) / manual grinding / deposited on a ceramic plate at the state of a biscuit / heating in a furnace 0↑1000 °C in normal atmosphere / slow cooling in furnace |
| green [considerably tarnished by the «rusty brown»] | 1515 | mineral : crocidolite<br>rock : dark greyish blue<br>powder : pale greyish blue<br>origin : Griqualand district, South Africa<br><br>production process:<br>4 g of crocidolite + 50 ml nitric acid / soaking: 4 wk. / drying on hot plate (rusty brown / blue [light green reflection]) / irradiated with gamma rays at 190.22 Mrad<br>(followed at «dark chocolate-brown [grey tone]») |
| green / yellow / orange / dark chocolate-brown<br>↓ | 1516 | mineral : galena<br>rock : dark grey, with metallic brilliance<br>powder : dark grey, with metallic brilliance<br>origin : Trail, British Columbia<br><br>mineral : cement[1138]<br>powder : white<br><br>production process:<br>(followed from «chocolate-brown darker than "dark chocolate-brown"»)<br>27.40 g of cement + add. 13 cc of water / manual grinding / moulding / 1 g of powdered galena immediately deposited at the surface of a humid piece of cement / hardening / addition of 5 g of galena at the surface of the dried piece of cement:<br>0↑1900 °F[280] |
| green / yellow / orange / dark chocolate-brown | 1517 | 0↑1950 °F[280] |
| | | mineral : galena<br>rock : dark grey, with metallic brilliance<br>powder : dark grey, with metallic brilliance |

| | | |
|---|---|---|
| green / orange | 1518 | origin : Trail, British Columbia<br><br><u>production process:</u><br>(followed from «medium beige [light green tone]»)<br>2 g of galena + 2 g of sodium carbonate / 1400 °F / 1 h[280] |
| green / brown | 1519 | mineral : goethite[106]<br>powder : orange rust<br>origin : Red Mill, in the suburbs of Cap-de-la-Madeleine, Québec<br><br>mineral : galena<br>rock : dark grey, with metallic brilliance<br>powder : dark grey, with metallic brilliance<br>origin : Trail, British Columbia<br><br>mineral : cement[1138]<br>powder : white<br><br><u>production process:</u><br>1 g of goethite integrated to the mass of 27.40 g of cement + 13 cc of water / manual grinding / moulding / hardening / addition at the surface of the piece of dried cement of 3 g of galena / 0↑1700 °F[280,282]<br>(followed at «pinkish orange / yellow [orange tone] / light pink [orange tone]») [shale (forma- of Sillery)[359]], at «dark green / brown [orange tone] / iron-grey / yellow / orange» [asbestos[4]], at «apple-green» [graphite] and at «apple-green / yellowish orange» [bauxite[92]]) |
| | | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; piece measuring 1/2" x 4 7/8" x 1/8" and weighing 15 g<br>powder : light grey<br>origin : East Broughton, Québec<br><br><u>production process:</u><br>(followed from «dark brown»)<br>2 g of galena + 2 g of sodium carbonate / deposited on a piece of steatite: |
| green \| | 1520 | 1700 °F / 1 h[280] |
| green \| | 1521 | 1800 °F / 1 h[280] |
| ↓ green / brown | 1522 | 1900 °F / 1 h[280] |

| | | |
|---|---|---|
| green darker and greener than «green» | 1523 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «mossy green more intense than "mossy green"»)<br>5 g of malachite + 25 ml ammonia / natural drying (mossy greenish turquoise) / irradiated with gamma rays at 424.7 Mrad |
| green | 1524 | mineral : amazonite<br>rock : light greenish turquoise<br>powder : white (turquoise reflection)<br>origin : Lac Sairs, Témiscamingue, Québec<br><br>production process:<br>(followed from «brown»)<br>2 g of amazonite + 2 g of sodium carbonate:<br>0↑1800 °F + 1 h at 1800 °F |
| ↓ | | |
| green | 1525 | 0↑1900 °F + 1 h at 1900 °F |
| green | 1526 | production process:<br>2 g of amazonite + 2 g of sodium carbonate / 0↑1900 °F + 1 h at 1900 °F (green) / irradiated with electrons at 162,431 rad |
| green | 1527 | mineral : agate<br>rock : grey (with a light orange circular area on the surface), slightly translucid<br>powder : very light grey<br>origin : unknown<br><br>production process:<br>3 g of agate + 40 ml hydrochloric acid / soaking: 1 wk. / separation of the liquid and the solid / natural drying / colour of the liquid[350] |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «mixture of particles: beige / green»)<br>0↑1900 °F (chamois [orange tone a little more accentuated than «light orange tone»]): 50 g + 200 |

| | | |
|---|---|---|
| | | ml hydrochloric acid <u>or</u> asbestos entirely covered with hydrochloric acid / soaking: 1 wk. / drying on hot plate (vivid sunny yellow [light green tone]): .50 g + .50 g of sodium carbonate: |
| green | 1528 | 0↑1500 °F |
| green | 1529 | 0↑1600 °F |
| green | 1530 | 0↑1700 °F |
| green | 1531 | 0↑1850 °F |
| green ↓ | 1532 | 0↑1900 °F |
| green | 1533 | <u>production process:</u> 50 g of asbestos + 200 ml hydrochloric acid <u>or</u> asbestos entirely covered with hydrochloric acid / soaking: 1 wk. / drying on hot plate (vivid yellow): .50 g + .50 g of sodium carbonate / 0↑1900 °F |
| | | mineral : andulusite<br>rock : light brownish grey<br>powder : light grey<br>origin : Bimbowrie, South Australia<br><br><u>production process:</u><br>(followed from «mixture of particles: greenish turquoise / olive-green»)<br>2 g of andulusite + 2 g of sodium carbonate: |
| green | 1534 | 0↑1800 °F + 1 h at 1800 °F |
| green ↓ | 1535 | 0↑1900 °F + 1 h at 1900 °F |
| | | mineral : beryl<br>rock : intense grass-green, slightly translucid<br>powder : greenish grey<br>origin : unknown<br><br><u>production process:</u> |
| green | 1536 | 1 g of beryl + 1 g of sodium carbonate / 1600 °F / 1 h |
| | | mineral : fluorescent calcite<br>rock : white (localized grey or brown reflection), translucid<br>powder : white (yellow reflection)<br>origin : Bancroft, Ontario |

| | | |
|---|---|---|
| green | 1537 | production process:<br>2 g of calcite + 3 g of sodium carbonate / 1700 °F / 1 h[283] |
| green | 1538 | mineral : calcite<br>rock : light pink<br>powder : pinkish white<br>origin : Huddersfield district, Pontiac county, Québec<br><br>production process:<br>1 g of calcite + 1 g of sodium carbonate / 1700 °F / 1 h |
| green | 1539 | mineral : chalcocite<br>rock : dark iron-grey (with localized turquoise oxidation)<br>powder : dark iron-grey<br>origin : Butte, Montana, United States<br><br>production process:<br>2 g of chalcocite + 2 g of sodium carbonate / 1900 °F / 1 h (mixture of particles: beige / brown [with metallic copper particles]) / irradiated with gamma rays at 64.7 Mrad[283]<br>(followed at «beige [light brown tone]») |
| green | 1540 | mineral : coal<br>rock : black<br>powder : brownish black<br>origin : bank of St.-Lawrence river at the city of Québec, Québec<br><br>production process:<br>2 g of coal + 2 g of sodium carbonate / 0↑1500 °F + 1 h at 1500 °F |
| green | 1541 | mineral : copper<br>rock : reddish brown, with metallic luster<br>powder : reddish brown, with metallic luster<br>origin : unknown<br><br>production process:<br>100 g of copper + 100 ml nitric acid / soaking: 5 mo. / natural drying (light bluish turquoise): 50 g + 100 ml phosphoric acid / soaking: 3 wk. / drying on hot plate (still humid) / colour of the liquid<br>(followed at «very light green») |
| | | mineral : fluorine<br>rock : reddish violet, translucid |

245

| | | |
|---|---|---|
| | | powder : very light grey<br>origin : Ohio, United States<br><br>production process:<br>1 g of fluorine + 1 g of sodium carbonate /<br>1700 °F / 1 h |
| green | 1542 | |
| green [with yellow particles] | 1543 | mineral : granite gneiss<br>rock : reddish beige<br>powder : medium pink (light brown tone)<br>origin : Lac Beauport, region of the city of Québec, Québec<br><br>production process:<br>(followed from «light brown»)<br>2 g of gneiss + 2 g of sodium carbonate /<br>0↑1600 °F + 1 h at 1600 °F<br>(followed at «pale emerald-green») |
| green | 1544 | mineral : microcline<br>rock : white (grey reflection)<br>powder : white (grey reflection)<br>origin : Buckingham, Québec<br><br>production process:<br>(followed at «greenish blue»)<br>2 g of microcline + 2 g of sodium carbonate /<br>0↑1800 °F + 1 h at 1800 °F<br>(followed at «greyish blue») |
| green (with bluish green areas) | 1545 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>2 g of molybdenite + 2 g of sodium carbonate /<br>1500 °F / 45 min. (intense bluish green) / irradiated with electrons at 162,431 rad<br>(followed at «dark emerald-green») |
| green | 1546 | mineral : orthoclase<br>rock : light pinkish beige<br>powder : very light beige<br>origin : mine near Buckingham, Papineau county, Québec<br><br>production process:<br>2 g of orthoclase + 2 g of sodium carbonate /<br>0↑1900 °F + 1 h at 1900 °F (bluish green) / irradiated with gamma rays at 63.88 Mrad |

| | | |
|---|---|---|
| | | (followed at «medium and intense grass-green») |
| cold green | 1547 | mineral : uraninite<br>rock : medium chocolate-brown (red Bordeau tone)<br>powder : medium milky chocolate-brown<br>origin : Yellowknife, Canada<br><br>production process:<br>0↑1900 °F (medium brown [orange tone]): 1 g + 20 ml phosphoric acid / soaking: 4 years / drying on hot plate (still humid) / colour of the liquid[7] |
| green | 1548 | mineral : quartz<br>rock : light pink, translucid<br>powder : very light grey<br>origin : unknown<br><br>production process:<br>4 g of quartz + 40 ml hydrochloric acid / soaking: 7 d. / separation of the liquid and the solid / natural drying / colour of the liquid[217] |
| green | 1549 | mineral : steatite<br>rock : light cold grey, slightly translucid<br>powder : light grey<br>origin : East Broughton, Québec<br><br>production process:<br>rock entirely covered with 20 ml hydrochloric acid / soaking: 2 wk. / irradiated with gamma rays at 11.4 Mrad / drying on sand bath, completed on hot plate[285] |
| | | mineral : steatite<br>rock : light evergreen<br>powder : white<br>origin : East Broughton, Québec<br><br>production process:<br>(followed from «brownish beige»)<br>2 g of steatite + 2 g of sodium carbonate: |
| green | 1550 | 0↑1700 °F + 15 min. at 1700 °F |
| green ↓ | 1551 | 0↑1700 °F + 30 min. at 1700 °F |
| green | 1552 | 0↑1700 °F + 45 min. at 1700 °F<br>(followed at «bluish green») |
| | | mineral : stibnite<br>rock : dark grey, with silver and bluish |

| | | |
|---|---|---|
| green | 1553 | metallic briliance<br>powder : dark grey<br>origin : Consolidated Durham Mine, Saint-Georges, New Brunswick<br><br>production process:<br>1 g of stibnite + 100 ml hydrochloric acid / soaking: 2 wk. / drying on hot plate |
| green | 1554 | mineral : nickel sulphide<br>rock : dark grey<br>powder : dark grey<br>origin : Sudbury, Ontario<br><br>production process:<br>2 g of nickel sulphide + 25 ml sulphuric acid / boiling reaction as soon as mineral is deposited in acid / soaking: 24 h / separation of the liquid and the solid immediately after the reaction / drying on hot plate / colour of the liquid[7] |
| green | 1555 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>0↑1900 °F (dark iron-grey): .50 g + 80 ml phosphoric acid / soaking: 2 wk. / drying on hot plate (still humid) / colour of the liquid[7] |
| green | 1556 | mineral : obsidian<br>rock : very dark smok y grey, almost black<br>powder : light grey<br>origin : Arkansas, United States<br><br>production process:<br>(followed from «mixture of particles: green / brown [orange tone]»)<br>2 g of obsidian + 2 g of sodium carbonate / 0↑1700 °F + 1 h at 1700 °F<br>(followed at «grass-green») |
| «unnameble» medium green | 1557 | mineral : crocidolite<br>rock : dark greyish blue<br>powder : pale greyish blue<br>origin : Griqualand district, South Africa<br><br>production process:<br>4 g of crocidolite + 200 ml sulphuric acid / soaking: 4 wk. / drying on hot plate[206] |

| | | |
|---|---|---|
| ↓<br>«unnameble» green a little more green | 1558 | 4 g of crocidolite + 200 ml sulphuric acid / soaking: 4 wk. / drying on hot plate («unnameble» medium green) / irradiated with gamma rays at 190.22 Mrad (followed at «greyish green [brown reflection]») |
| intense green | 1559 | mineral : actinolite<br>rock : light and cold evergreen<br>powder : light grey (light green tone)<br>origin : erratic bloc found at Saint-Philémon, near Dorchester, Québec<br><br><u>production process:</u><br>(followed from «mixture of particles: green / brown»)<br>2 g of actinolite + 2 g of sodium carbonate / 0↑1800 °F + 1 h at 1800 °F |
| vivid green | 1560 | mineral : malachite<br>rock : ribboned variety of pronounced mint-green<br>powder : light and brilliant mint-green<br>origin : Katanga province, at 300 km from Lubumbachai, Zaïr, Africa<br><br><u>production process:</u><br>2 g of malachite + 25 ml hydrochloric acid / natural drying / irradiated with electrons at 162,431 rad |
| vivid, intense and saturated green | 1561 | mineral : actinolite<br>rock : light and cold evergreen<br>powder : light grey (light green tone)<br>origin : erratic blockfound at Saint-Philémon, near Dorchester, Québec<br><br><u>production process:</u><br>rock covered with 20 ml hydrochloric acid / soaking: 2 wk. / irradiated with gamma rays at 5.7 Mrad / drying on sand bath, completed on hot plate |
| intense green | 1562 | mineral : beryl<br>rock : very light yellowish green, slightly translucid<br>powder : white (green reflection)<br>origin : Lacorne district, Abitibi, Québec<br><br><u>production process:</u><br>rock hermetically wrapped in bread dough / 1600 °F |

| | | |
|---|---|---|
| | | / 1 h |
| accentuated green | 1563 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>production process:<br>1 g of tremolite + 1.50 g of sodium carbonate / 1600 °F / 8 h (very dark grass-green): .50 g + .50 g of sulphur (pale greenish yellow) / irradiated with gamma rays at 63.984 Mrad[287] (followed at «medium beige [light green tone]») |
| very intense green | 1563.1 | mineral : copper<br>rock : reddish brown, with metallic luster<br>powder : reddish brown, with metallic luster<br>origin : unknown<br><br>production process:<br>100 g of copper + 100 ml nitric acid / soaking: 5 mo. / natural drying (light bluish turquoise) / 0↑400 °F (greyish green): .50 g + 5 ml ammonia / natural drying (bluish turquoise [grey tone more accentuated]): .1 g + 50 cc of transparent polyester resin + 1% of catalyst / manual grinding / deposited in an hermetically closed container with a cover and put in a drying oven for plastic at 100 °F until hardening |
| | 1564 | mineral : chromite<br>rock : blackish grey<br>powder : medium brownish grey<br>origin : Black Lake, near Thetford Mines, Québec |
| very powerful green | 1565 | production process:<br>0↑1900 °F (medium chocolate-brown): .50 g + 50 ml phosphoric acid / soaking: 2 wk. / drying on hot plate (still humid) |
| profound green | 1566 | production process:<br>0↑1900 °F (medium chocolate-brown): 1 g + 50 ml sulphuric acid / soaking: 2 wk. / drying on hot plate |

| | | |
|---|---|---|
| | | mineral : smaltite[25], variety of skutterudite<br>rock : dark iron-grey, with silver metallic brilliance<br>powder : dark grey<br>origin : Cobalt, Ontario |
| very vivid green | 1567 | <u>production process:</u><br>3 g of smaltite + 80 ml hydrochloric acid / soaking: 2 wk. / separation of the liquid and the solid / drying on hot plate / colour of the liquid[289a] |
| | | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec |
| green more strongly accentuated and darker | 1568 | <u>production process:</u><br>(followed from «greenish turquoise considerably more accentuated than "light greenish turquoise"») powder «very, very light green» irradiated with gamma rays at 604.53 Mrad[289] |
| | 1569 | mineral : agate<br>rock : dark grass-green, slightly translucid<br>powder : light grey (light green tone)<br>origin : St.-Lawrence river bank, region of Maria, Gaspésie, Québec |
| dark green | 1570 | <u>production process:</u><br>2 g of agate + 2 g of sodium carbonate / 0↑1800 °F + 1 h at 1800 °F (emerald-green) / irradiated with gamma rays at 64.7 Mrad[239] |
| | | mineral : amazonite<br>rock : light greenish turquoise<br>powder : white (turquoise reflection)<br>origin : Lac Sairs, Témiscamingue, Québec |
| dark green | 1571 | <u>production process:</u><br>2 g of amazonite + 2 g of sodium carbonate / 0↑1900 °F + 1 h at 1900 °F (green) / irradiated with gamma rays at 64.7 Mrad |
| | | mineral : galena<br>rock : dark grey, with metallic brilliance<br>powder : dark grey, with metallic brilliance<br>origin : Trail, British Columbia |

| | | |
|---|---|---|
| | | mineral : asbestos[4]<br>rock : dark grey (green reflection)<br>powder : light grey (green reflection)<br>origin : Asbestos Corporation Ltd., Thetford Mines, Québec<br><br>mineral : cement[1138]<br>powder : white<br><br>production process: |
| dark green / brown (orange tone) / iron-grey / yellow / orange | 1572 | 1 g of asbestos integrated to the mass of 27.40 g of cement + 13 cc of water / manual grinding / moulding / hardening / addition at the surface of the piece of dried cement of 3 g of galena / 0↑1700 °F[280,744]<br>(followed at «pinkish orange / yellowish orange / light pink [orange tone]» [shale (formation of Sillery[359])], at «apple-green» [graphite], at «apple-green / yellowish orange» [bauxite] and at «green / brown» [goethite[106]]) |
| | | mineral : galena<br>rock : dark grey, with metallic brilliance<br>powder : dark grey, with metallic brilliance<br>origin : Trail, British Columbia<br><br>production process:<br>(followed from «green [olive-green type]»)<br>4 g of galena powder deposited on a piece of stainless steel measuring 1" x 1": |
| dark green / brown | 1573 | 1400 °F / 10 min. / immediately removed[280] |
| ↓ | | |
| green a little lighter than «dark green» | 1574 | 1400 °F / 13 min. / immediately removed[280] |
| ↓ | | |
| green still lighter | 1575 | 1400 °F / 16 min. / immediately removed[280] |
| ↓ | | |
| green still lighter | 1576 | 1400 °F / 19 min. / immediately removed[280]<br>(followed at «brownish green») |
| | | production process:<br>(followed from «dark brown [orange tone with green localized reflections]») |
| zones: dark green / dark brownish caramel | 1576.1 | 1 g of galena + 6.50 g of glass powder (spruce pine batch) / manual grinding / deposited on a ceramic plate at the state of a biscuit / heated in a furnace 0↑1000 °C in normal atmosphere / slow cooling in furnace |
| ↓ | | |
| zones: dark green / medium green / | 1576.1 | 2 g of galena + 6.50 g of glass powder (spruce pine batch) / manual grinding / deposited on a cera- |

| | | |
|---|---|---|
| dark brown (orange tone) | | mic plate at the state of a biscuit / heated in a furnace 0↑1000 °C in normal atmosphere / slow cooling in furnace |
| dark green | 1577 | mineral : bornite<br>rock : reddish brown (with localized green and bluish green oxidation)<br>powder : reddish brown<br>origin : Lac Musset, Fosse du Labrador, Québec<br><br>production process:<br>(followed from «apple-green more accentuated than "light apple-green"»)<br>2 g of bornite + 15 ml nitric acid + 10 ml hydrochloric acid / soaking: 6 d. / separation of the liquid and the solid / natural drying (colour of the solid: mixture of particles: light green / accentuated green) / irradiated with electrons at 305,200 rad[73] |
| dark green | 1578 | production process:<br>2 g of bornite + 15 ml hydrochloric acid + 10 ml nitric acid / soaking: 6 d. / separation of the liquid and the solid / natural drying (colour of the liquid: vivid phtalo-green[217a]) / irradiated with electrons at 305,200 rad[73] |
| dark green | 1579 | mineral : chalcocite<br>rock : dark iron-grey (with localized turquoise oxidation)<br>powder : dark iron-grey<br>origin : Butte, Montana, United States<br><br>production process:<br>(followed at «greenish blue»)<br>0↑1900 °F (dark iron-grey): 1 g + 80 ml nitric acid / soaking: 2 wk. / separation of the liquid and the solid / desiccation / colour of the liquid[279]<br>(followed at «very light green») |
| dark green | 1580 | mineral : labrador<br>rock : blackish grey<br>powder : medium grey<br>origin : Lac Saint-Jean, Québec<br><br>production process:<br>2 g of labrador + 2 g of sodium carbonate / 0↑1900 °F + 1 h at 1900 °F (intense greenish blue) / irradiated with gamma rays at 64.7 Mrad[239]<br>(followed at «dark grass-green») |

253

| | | |
|---|---|---|
| dark green | 1580.1 | mineral : chrome<br>powder : light grey, with metallic brilliance<br><br>production process:<br>(followed from «dark khaki-green [yellow reflection]»)<br>1 g of chrome + 6.50 g of glass powder (spruce pine batch) / manual grinding / deposited on a ceramic plate at the state of a biscuit / heated in a furnace 0↑1000 °C in normal atmosphere / slow cooling in furnace |
| mixture of particles | | |
| pale green / pale blue | 1581 | mineral : copper concentrate (Cu-FeS)<br>powder : medium chocolate-brown (grey tone)<br>origin : Centre de recherche des Mines Noranda in Montréal, Québec<br><br>procédé de production:<br>4 g of concentrate + 50 ml sulphuric acid / soaking: 4 wk. / drying on hot plate (light grass-green) / irradiated with electrons at 302,831 rad[36] |
| green a little darker than «pale green» / brown a little darker than «pale brown» | 1582 | mineral : beryl<br>rock : very light yellowish green, slightly translucid<br>powder : white (green reflection)<br>origin : Lacorne district, Abitibi, Québec<br><br>production process:<br>2 g of beryl + 2 g of sodium carbonate / 0↑1700 °F + 1 h at 1700 °F (pale apple-green ) / irradiated with electrons at 302,831 rad[45] |
| light green / beige | 1583 | mineral : asbestos[4]<br>rock : dark grey (green reflection)<br>powder : light grey (green reflection)<br>origin : Asbestos Corporation Ltd., Thetford Mines, Québec<br><br>production process:<br>(followed at «beige [orange tone and pink reflection]»)<br>.50 g of asbestos + .50 g of sodium carbonate / 0↑1700 °F[699]<br>(followed at «light green») |
| light green / beige | 1584 | production process:<br>.50 g of asbestos + .50 g of sodium carbonate / 1700 °F / 1 h |

| | | |
|---|---|---|
| light green / beige | 1585 | mineral : dolomite<br>rock : light grey<br>powder : light grey<br>origin : Shefferville, Ungava, Québec<br><br><u>production process:</u><br>(followed from «greenish grey)<br>2 g of dolomite + 2 g of sodium carbonate /<br>0↑1500 °F + 1 h at 1500 °F<br>(followed at «light beige») |
| light green / beige | 1586 | mineral : apatite<br>rock : medium brownish red<br>powder : light pinkish beige<br>origin : Ile Calumet, Pontiac county, Québec<br><br><u>production process:</u><br>(followed from «grey [beige tone]»)<br>2 g of apatite + 2 g of sodium carbonate /<br>0↑1900 °F + 1 h at 1900 °F |
| light green / light yellow<br>↓<br>light green / light pink (orange tone) | 1587<br><br>1588 | mineral : barite<br>rock : pinkish white<br><br>powder : white<br>origin : Niobec Mine, Saint-Honoré, Saguenay, Québec<br><br><u>production process:</u><br>(followed from «very light cream»)<br>2 g of barite + 2 g of sodium carbonate:<br>0↑1800 °F + 1 h at 1800 °F<br><br>0↑1900 °F + 1 h at 1900 °F |
| light green / accentuated green | 1589 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «mixture of particles: bluish green / light and vivid apple-green» and «mixture of particles: light phtalo-green / intense phtalo-green»)<br>2 g of bornite + 15 ml nitric acid + 10 ml hydrochloric acid / soaking: 6 d. / separation of the liquid and the solid / natural drying / colour of the solid[272]<br>(followed at «mixture of particles: medium phtalo-green / intense greenish blue») |

| | | |
|---|---|---|
| light green / light yellowish beige | 1590 | mineral : chalcocite<br>rock : dark iron-grey (with localized turquoise oxidation)<br>powder : dark iron-grey<br>origin : Butte, Montana, United States<br><br>production process:<br>0↑1900 °F (dark iron-grey): 1 g + 80 ml nitric acid / soaking: 2 wk. / separation of the liquid and the solid / natural drying (colour of the liquid: greenish blue[24]) / irradiated with gamma rays at 64.7 Mrad<br>(followed at «brown (orange tone) [between "medium brown (orange tone)" and "dark brown (orange tone)"]») |
| green / brown | 1591 | mineral : actinolite<br>rock : light and cold evergreen<br>powder : light grey (light green tone)<br>origin : erratic bloc found at Saint-Philémon, near Dorchester, Québec<br><br>production process:<br>(followed from «brown»)<br>2 g of actinolite + 2 g of sodium carbonate / 0↑1700 °F + 1 h at 1700 °F<br>(followed at «intense green») |
| green / beige | 1592 | mineral : fluorescent calcite<br>rock : white (localized grey and brown reflection), translucid<br>powder : white (yellow reflection)<br>origin : Bancroft, Ontario<br><br>production process:<br>(followed from «yellow ochre [beige tone] or beige ochre [yellow tone]»)<br>2 g of calcite + 2 g of sodium carbonate / 0↑1700 °F + 1 h at 1700 °F<br>(followed at «beige») |
| green / brown | 1593 | mineral : graphite<br>rock : dark grey, with metallic brilliance<br>powder : dark grey, with metallic brilliance<br>origin : Grenville, Québec<br>production process:<br>2 g of graphite + 3 g of sodium carbonate / 1800 °F / 1 h[941] |
| | | mineral : granite gneiss<br>rock : reddish beige<br>powder : medium pink (light brown tone)<br>origin : Lac Beauport, region of the city of Québec, Québec |

256

| | | |
|---|---|---|
| green / grey / brown | 1594 | production process:<br>(followed at «emerald-green more accentuated than "pale emerald-green"»)<br>2 g of gneiss + 2 g of sodium carbonate /<br>0↑1900 °F + 1 h at 1900 °F |
| green / bluish grey | 1595 | mineral : orthoclase<br>rock : light pinkish beige<br>powder : very light beige<br>origin : mine near Buckingham, Papineau county, Québec<br><br>production process:<br>2 g of orthoclase + 2 g of sodium carbonate /<br>0↑1900 °F + 1 h at 1900 °F (bluish green) /<br>irradiated with electrons at 162,431 rad<br>(followed at «dark greyish green») |
| green / brown (orange tone) | 1596 | mineral : fuel oil soot[86]<br>powder : profound brownish black<br>origin : boiler room at Laval University, city of Québec, Québec<br><br>production process:<br>(followed from «mixture of particles: brown / orange»)<br>2 g of soot + 2 g of sodium carbonate:<br>0↑1400 °F + 1 h at 1400 °F<br><br>(followed at «beige [orange tone]») |
| ↓ | | (followed from «beige [orange tone]») |
| green / orange | 1597 | 0↑1600 °F + 1 h at 1600 °F<br><br>(followed at «orange») |
| ↓ | | (followed from «orange») |
| green / orange | 1598 | 0↑1900 °F + 1 h at 1900 °F |
| green / orange | 1599 | mineral : obsidian<br>rock : very dark smok y grey, almost black<br>powder : light grey<br>origin : Arkansas, United States<br><br>production process:<br>(followed from «mixture of particles: greyish green / brown»)<br>2 g of obsidian + 2 g of sodium carbonate:<br>0↑1500 °F + 1 h at 1500 °F |
| ↓ | | |
| green / brown | 1600 | 0↑1600 °F + 1 h at 1600 °F |

| | | |
|---|---|---|
| (orange tone) | | (followed at «green») |
| pearly green | | |
| light pearly green | 1601 | mineral : steatite<br>rock : light cold grey, slightly translucid<br>powder : light grey<br>origin : East Broughton, Québec<br><br>production process:<br>2 g of steatite + 20 ml phosphoric acid / soaking: 3 d. / drying on hot plate (still humid) / colour of the liquid[7,278] |
| light pearly green | 1602 | production process:<br>60 g of steatite + 100 ml phosphoric acid / soaking: 3 wk. / drying on hot plate (still humid) / colour of the liquid[7,278] |
| mint-green | | |
| localized and very light mint-green (light grey tone) | 1603 | mineral : asbestos[4]<br>rock : dark grey (green reflection)<br>powder : light grey (green reflection)<br>origin : Asbestos Corporation Ltd., Thetford Mines, Québec<br><br>mineral : cement[1138]<br>powder : white<br><br>production process:<br>(followed from «localized and very light greenish grey»)<br>250 g of asbestos + 1650 ml hydrochloric acid in a 2000 ml becher or asbestos entirely covered with hydrochloric acid in a vertical container / soaking: 1 wk. / drying on hot plate (formation of 3 superposed layers of colours, the deepest being: apple-green): 3 g + 27.40 g of cement + 13 cc of water / manual grinding / moulding / hardening / 0↑1950 °F |
| mint-green a little more pale than «light mint- | 1604 | mineral : crocidolite<br>rock : dark greyish blue<br>powder : pale greyish blue<br>origin : Griqualand district, South Africa<br><br>production process:<br>powder irradiated with gamma rays at:<br>64.7 Mrad |

| | | |
|---|---|---|
| green»<br>↓<br>mint-green still a little more pale<br>↓ | 1605 | 190.22 Mrad[239] |
| mint-green still a little more pale | 1606 | 424.7 Mrad[292]<br>(followed at «bluish green darker than "pale bluish green"») |
| light mint-green | 1607 | mineral : actinolite<br>rock : light and cold evergreen<br>powder : light grey (light green tone)<br>origin : erratic bloc found at Saint-Philémon, near Dorchester, Québec<br><br><u>production process:</u><br>3 g of actinolite + 50 ml sulphuric acid / soaking: 2 wk. / drying on hot plate |
| light mint-green | 1607.1 | mineral : copper<br>rock : reddish brown, with metallic luster<br>powder : reddish brown, with metallic luster<br>origin : unknown<br><br><u>production process:</u><br>100 g of copper + 100 ml hydrochloric acid / soaking: 5 mo. / drying on hot plate (fairly pronounced greenish turquoise) / 0↑425 °F (greenish turquoise [light grey tone]): .50 g + 5 ml ammonia / natural drying (bluish turquoise [accentuated green tone]): .2 g + 50 cc of transparent polyester resin + 1% of catalyst / manual grinding / deposited in an hermetically closed container with a cover / hardening |
| light mint-green | 1608 | mineral : chalcocite<br>rock : dark iron-grey (with localized turquoise oxidation)<br>powder : dark iron-grey<br>origin : Butte, Montana, United States<br><br><u>production process:</u><br>0↑1900 °F (dark iron-grey): 1 g + 50 ml sulphuric acid / soaking: 2 wk. / separation of the liquid and the solid / drying on hot plate (colour of the solid: light mint-green [blue tone]) / irradiated with gamma rays at 64.7 Mrad<br>(followed at «mixture of particles: medium chocolate-brown / light beige / grey / greenish grey») |
| | | mineral : chalcopyrite |

| | | |
|---|---|---|
| | | rock : brass-yellow, with metallic luster<br>powder : dark grey (with golden particles)<br>origin : Noranda Mines, Noranda, Abitibi, Québec<br><br>production process: |
| light mint-green | 1609 | 5 g of chalcopyrite + 20 ml sulphuric acid / soaking: 3 d. / drying on hot plate |
| | | mineral : amazon stone<br>rock : light greenish turquoise, translucid<br>powder : white (turquoise reflection)<br>origin : unknown<br><br>production process: |
| light mint-green | 1610 | 4 g of amazon stone + 40 ml nitric acid / soaking: 1 wk. / separation of the liquid and the solid / natural drying (colour of the liquid: medium bluish turquoise) / irradiated with gamma rays at 64.7 Mrad<br>(followed at «light beige») |
| | | mineral : antigorite<br>rock : pale yellowish green<br>powder : very pale greenish yellow<br>origin : Canadian Refractories Mine, Kilmar, Québec<br><br>production process:<br>(followed from «intense olive-green»)<br>2 g of antigorite + 2 g of sodium carbonate: |
| light mint-green | 1611 | 0↑1600 °F + 1 h at 1600 °F |
| ↓ | | |
| light mint-green | 1612 | 0↑1700 °F + 1 h at 1700 °F |
| ↓ | | |
| light mint-green | 1613 | 0↑1800 °F + 1 h at 1800 °F<br>(followed at «mixture of particles: olive-green / beige») |
| | | mineral : steatite<br>rock : light evergreen<br>powder : white<br>origin : East Broughton, Québec<br><br>production process:<br>(followed from «light apple-green») |
| light mint-green | 1614 | 40 g of steatite + 100 ml phosphoric acid / soaking: 3 wk. / separation of the 1st liquid and the solid / addition to the solid of 100 ml phosphoric |

| | | |
|---|---|---|
| | | acid / soaking: 3 wk. / separation of the 2nd liquid and the solid / drying on hot plate (still humid) / colour of the 2nd liquid[77,297] |
| light and intense mint-green | 1615 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml sulphuric acid / soaking: 2 wk. / separation of the liquid and the solid / drying on hot plate / colour of the liquid[229,296]<br>(followed at «intense olive-green») |
| mint-green more pronounced than «light mint-green» | 1616 | production process:<br>0↑1900 °F (dark iron-grey): 1 g + 50 ml sulphuric acid / soaking: 2 wk. / separation of the liquid and the solid / drying on hot plate (colour of the solid: light mint-green [blue tone]) / irradiated with electrons at 162,431 rad |
| mint-green more pronounced than «light mint-green» | 1617 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>0↑500 °F<br><br>(followed at «mint-green [brown tone]») |
| mint-green type more accentuated and luminous than «light mint-green» | 1618 | production process:<br>powder irradiated with electrons at 302,831 rad[36] |
| | 1619 | mineral : malachite<br>rock : pronounced mint-green<br>powder : light mint-green<br>origin : Research Center of the Noranda Mines, Montréal, Québec |

| | | |
|---|---|---|
| mint-green type ↓ which ↓ intensifies and ↓ becomes ↓ considerably more saturated than «light mint-green» | 1620<br>1621<br>1622<br>1623<br>1624<br>1625<br>1626<br>1627<br>1628 | <u>production process:</u><br>powder irradiated with gamma rays at:<br>5 Mrad<br>10 Mrad<br>57.4 Mrad<br>102.4 Mrad<br>148.4 Mrad<br>201.6 Mrad<br>247.6 Mrad<br>287.3 Mrad<br>360 Mrad[300] |
| mint-green considerably more intense and lightly darker than «light and cold mint-green» | 1629 | mineral : beryl<br>rock : light blue, slightly translucid<br>powder : light grey<br>origin : Abitibi, Québec<br><br><u>production process:</u><br>(followed from «very light greenish grey»)<br>2 g of beryl + 25 ml hydrochloric acid / soaking: 24 h / drying on hot plate (light yellowish green): .3 g + 50 cc of transparent polyester resin + 1% of catalyst / manual grinding / moulding / hardening (light and cold mint-green) / irradiated with electrons at 305,082 rad[354] |
| mint-green darker than «light mint-green» | 1630 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br><u>production process:</u><br>3 g of apatite + 20 ml hydrochloric acid / soaking: 3 d. / drying on hot plate (very light yellow): .3 g + 50 cc of transparent polyester resin + 1% of catalyst / manual grinding / moulding / hardening (light, cold and quite vivid mint-green) / irradiated with electrons at 155,082 rad (followed at «mint-green [light yellow tone]») |
| | | mineral : copper<br>rock : reddish brown, with metallic luster<br>powder : reddish brown, with metallic luster<br>origin : unknown |

| | | |
|---|---|---|
| mint-green considerably lighter and more vivid than «mint-green» | 1631 | production process: 100 g of copper + 100 ml hydrochloric acid / soaking: 5 mo. / natural drying (mint-green [malachite-green type]) / 0↑450 °F (mint-green [malachite-green type] a little darker than «mint-green [malachite type]») / irradiated with electrons at 302,831 rad[45,293] |
| | | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml hydrochloric acid / soaking: 3 d. / drying on hot plate (white [light yellow reflection]): .3 g + 50 cc of transparent polyester resin + 1% of catalyst / manual grinding / moulding / hardening (quite vivid light mint-green) / irradiated with electrons at: |
| mint-green more accentuated than «light mint-green» | 1632 | 155,082 rad |
| ↓ | | |
| medium mint-green | 1633 | 305,082 rad[73] |
| | | mineral : shale (formation of Sillery)[547]<br>rock : medium brownish red (violet tone)<br>powder : light reddish brown (violet tone), mat<br>origin : cliff of Cap Rouge in the suburbs of Québec city, Québec<br><br>production process:<br>1% of shale is mixed with molten glass (crystal) and the entirety is melted at 2,400 °F (grass green [olive-green reflection]) / irradiated with gamma rays at: |
| mint-green a little darker than «mint-green» | 1633.1 | 2.47 Mrad |
| ↓ | | |
| mint-green still slightly darker | 1633.2 | 4.94 Mrad |
| ↓ | | |
| mint-green still | 1633.3 | 7.41 Mrad |

| | | |
|---|---|---|
| slightly darker<br>↓<br>mint-green still slightly darker | 1633.4 | 9.88 Mrad |
| mint-green considerably more intense than «medium mint-green» | 1634 | mineral : obsidian<br>rock : very dark smok y grey, almost black<br>powder : light grey<br>origin : Arkansas, United States<br><br>production process:<br>(followed from «light mint-green [brown tone] or light brown [mint-green tone]»)<br>2 g of obsidian + 20 ml hydrochloric acid / soaking: 3 d. / drying on hot plate (white): .3 g + 50 cc of transparent polyester resin + 1% of catalyst / manual grinding / moulding / hardening (cold medium mint-green) / irradiated with electrons at 305,082 rad[73] |
| dark and intense mint-green | 1635<br>1636 | mineral : chromite[294]<br>rock : dark grey<br>powder : dark grey<br>origin : Black Lake, Eastern Townships, Québec<br><br>production process:<br>2 g of chromite + 20 ml phosphoric acid / soaking: 3 d. / drying on sand bath[298] |
| intense and enhanced green [mint-green type] | 1637 | mineral : crocidolite<br>rock : dark greyish blue<br>powder : pale greyish blue<br>origin : Griqualand district, South Africa<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours, the one on the surface being dark green [mint-green type]) / irradiated with gamma rays at 190.22 Mrad (followed at «green [mint-green type], brown tone») |
| | | mineral : anorthosite<br>rock : dark grey<br>powder : medium grey<br>origin : Jonquière, Lac Saint-Jean, Québec |

264

| | | |
|---|---|---|
| intense mint-green | 1638 | production process:<br>(followed from «green [between "apple-green" and "mint-green"]»)<br>2 g of anorthosite + 2 g of sodium carbonate / 0↑1600 °F + 1 h at 1600 °F<br>(followed at «olive-green») |
| | 1639 | mineral : chalcopyrite<br>rock : brass-yellow, with metallic luster<br>powder : dark grey (with golden particles)<br>origin : Noranda Mines, Noranda, Abitibi, Québec |
| intense mint-green | 1640 | production process:<br>5 g of chalcopyrite + 20 ml sulphuric acid / soaking: 3 d. / drying on hot plate (light mint-green) / irradiated with gamma rays at 64.7 Mrad<br>(followed at «dark beige») |
| | | mineral : nickel sulphide<br>rock : dark grey<br>powder : dark grey<br>origin : Sudbury, Ontario |
| intense mint-green | 1641 | production process:<br>140 g of nickel sulphide + 100 ml nitric acid / soaking: 5 mo. / natural drying / colour of the liquid[24,217,299] |
| | | mineral : chromite[294]<br>rock : dark grey<br>powder : dark grey<br>origin : Black Lake, Eastern Townships, Québec |
| mint-green a little darker than «intense mint-green» | 1642 | production process:<br>2 g of chromite + 20 ml phosphoric acid / soaking: 3 d. / drying on sand bath (intense and dark mint-green) / irradiated with electrons at 162,431 rad |
| | | mineral : crocidolite<br>rock : dark greyish blue<br>powder : pale greyish blue<br>origin : Griqualand district, South Africa |
| dark green [malachite-green type] | 1643 | production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colour) / colour of the layer |

265

| | | |
|---|---|---|
| | | at the surface (followed at «dark green [light yellow tone]») |
| mint-green (blue tone) | | |
| light mint-green (blue tone) | 1644 | mineral : chalcocite<br>rock : dark iron-grey (with localized turquoise oxidation)<br>powder : dark iron-grey<br>origin : Butte, Montana, United States<br><br>production process:<br>(followed from «very light blue»)<br>0↑1900 °F (dark iron-grey): 1 g + 50 ml sulphuric acid / soaking: 2 wk. / separation of the liquid and the solid / drying on hot plate / colour of the solid[1192] |
| mint-green (yellow tone) | | |
| mint-green (light yellow tone) a little more intense than «light mint-green (light yellow tone)» | 1645 | mineral : chrysocolla<br>rock : light greenish turquoise<br>powder : very light greenish turquoise<br>origin : Mexico<br><br>production process:<br>(followed from «green darker than "light green"»)<br>1 g of chrysocolla + 4 ml ammonia / natural drying (bluish green): .2 g + 50 cc of transparent polyester resin + 1% of catalyst / manual grinding / moulding / hardening (light mint-green) / irradiated with electrons at 305,082 rad[73] |
| green (light yellow tone) considerably more intense than «light mint-green (yel- | 1646 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>(followed from «mint-green darker than "light mint-green"»)<br>3 g of apatite + 20 ml hydrochloric acid / soaking: 3 d. / drying on hot plate (very light yellow): .3 g + 50 cc of transparent polyester resin + 1% of catalyst / manual grinding / moulding / hardening (light, cold and quite vivid mint-green) |

| | | |
|---|---|---|
| low tone)» | | / irradiated with electrons at 305,082 rad[73] |
| mint-green (very light yellow tone) a little lighter than «intense mint-green (yellow tone)» | 1647 | mineral : chromite[294]<br>rock : dark grey<br>powder : dark grey<br>origin : Black Lake, Eastern Townships, Québec<br><br>production process:<br>2 g of chromite + 20 ml phosphoric acid / soaking: 3 d. / drying on sand bath (intense and dark mint-green) / irradiated with gamma rays at 64.7 Mrad<br><br>(followed at «green [between "olive-green" and "apple-green"]») |
| | | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>rock irradiated with gamma rays[290] at: |
| pronounced mint-green | 1648 | 5 Mrad |
| ↓ | 1649 | 10 Mrad |
| ↓ | 1650 | 57.4 Mrad |
| which evolves | 1651 | 102.4 Mrad |
| towards | 1652 | 148.4 Mrad |
| ↓ | 1653 | 201.6 Mrad |
| ↓ | 1654 | 247.6 Mrad |
| ↓ | 1655 | 287.3 Mrad[291] |
| mint-green (light yellow tone) more pale than «pronounced mint-green (yellow tone)» | 1656 | 360 Mrad |
| mint-green (brown tone) | | |
| | | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «mint-green more pronounced than "light mint-green"») |

| | | |
|---|---|---|
| mint-green (brown tone) | 1657 | 0↑600 °F<br>(followed at «greenish brown [or colour between "brown" and "green"]») |
| | | mineral : crocidolite<br>rock : dark greyish blue<br>powder : pale greyish blue<br>origin : Griqualand district, South Africa<br><br>production process:<br>(followed from «green [intense and enhanced mint-green type]») |
| green [mint-green type] a little darker than «accentuated mint-green (brown tone)» | 1658 | 250 g of crocidolite + 1650 ml hydrochloric acid in a 2000 ml becher or crocidolite entirely covered with hydrochloric acid in a vertical container / soaking: 1 wk. / drying on hot plate (formation of 2 layers of colour superposed, the one at the surface being dark green [mint-green type]) / irradiated with gamma rays at 550.22 Mrad |
| | | mineral : copper<br>rock : reddish brown, with metallic luster<br>powder : reddish brown, with metallic luster<br>origin : unknown<br><br>production process:<br>100 g of copper + 100 ml hydrochloric acid / soaking: 5 mo. / natural drying (mint-green [malachite-green type]): |
| mint-green darker than «mint-green» | 1659 | 0↑ 350 °F |
| ↓ | 1660 | 0↑ 400 °F |
| which evolves | 1661 | 0↑ 450 °F |
| slowly towards | 1662 | 0↑ 500 °F |
| ↓ | 1663 | 0↑ 600 °F |
| ↓ | 1664 | 0↑ 625 °F[301] |
| ↓ | 1665 | 0↑ 650 °F |
| ↓ | 1666 | 0↑ 675 °F |
| ↓ | 1667 | 0↑ 700 °F |
| ↓ | 1668 | 0↑ 800 °F |
| dark mint-green (brown tone) | 1669 | 0↑1000 °F[302] |
| mint-green (grey tone) | | |
| | | mineral : chrysocolla<br>rock : light greenish turquoise<br>powder : very light greenish turquoise<br>origin : Mexico |

| | | |
|---|---|---|
| mint-green (light grey tone) | 1669.1 | production process:<br>2 g of chrysocolla + 20 ml ether / natural drying |
| mint-green [malachite-green type] | | |
| mint-green (malachite-green type) | 1670 | mineral : chrysocolla<br>rock : light greenish turquoise<br>powder : very light greenish turquoise<br>origin : Mexico<br><br>production process:<br>2 g of chrysocolla + 25 ml nitric acid / separation of the liquid and the solid / natural drying / colour of the solid[32,298] |
| mint-green (malachite-green type) | 1671 | mineral : coal<br>rock : black<br>powder : brownish black<br>origin : St.-Lawrence river bank, city of Québec, Québec<br><br>production process:<br>(followed at «light green»)<br>2 g of coal + 2 g of sodium carbonate / 0↑1500 °F + 45 min.[298] at 1500 °F<br>(followed at «intense blackish green») |
| mint-green (malachite-green type) | 1672 | mineral : copper<br>rock : reddish brown, with metallic luster<br>powder : reddish brown, with metallic luster<br>origin : unknown<br><br>production process:<br>100 g of copper + 100 ml hydrochloric acid / soaking: 5 mo. / natural drying[298] |
| mint-green [malachite-green type] a little lighter and yellow than «mint-green [malachite-green type] a little darker than "mint-green [malachite-green type]"» | 1673 | production process:<br>100 g of copper + 100 ml hydrochloric acid / soaking: 5 mo. / natural drying (mint-green [malachite-green type]) / 0↑450 °F (mint-green [malachite-green type] a little darker than «mint-green [malachite-green type]») / irradiated with gamma rays at 64.7 Mrad[298]<br><br>(followed at «phtalo-green[217a] more intense than "phtalo-green"») |
| | | mineral : chromite |

| | | |
|---|---|---|
| | | rock : blackish grey<br>powder : medium brownish grey<br>origin : Black Lake, near Thetford Mines, Québec |
| intense mint-green (malachite-green type) | 1674 | <u>production process:</u><br>4 g of chromite + 80 ml sulphuric acid / soaking: 2 wk. / drying on hot plate[298] |
| evergreen | | |
| | | mineral : apatite<br>rock : light grass-green (light blue and yellow tones), very slightly translucid<br>powder : very light grey (light green tone)<br>origin : region of Buckingham, Québec |
| cold and very light evergreen | 1675 | <u>production process:</u><br>(followed from «very, very light greyish evergreen»)<br>powder irradiated with gamma rays at 244.53 Mrad (followed at «green [beige tone] more accentuated than "green [beige tone]"») |
| | | mineral : steatite<br>rock : light evergreen<br>powder : white<br>origin : East Broughton, Québec |
| evergreen very slightly darker than «light evergreen» | 1676 | <u>production process:</u><br>rock[67,69] irradiated with gamma rays:<br>5 Mrad |
| goes | 1677 | 10 Mrad |
| ↓ | 1678 | 57.4 Mrad |
| | 1679 | 65.704 Mrad |
| | 1680 | 102.4 Mrad |
| | 1681 | 124.704 Mrad |
| darkening | 1682 | 148.4 Mrad[307]<br>(followed at «dark and sombre olive-green [grey tone]») |
| | | mineral : hornblende<br>rock : medium evergreen (light grey tone), with vitreous brilliance<br>powder : medium cold grey (light green tone)<br>origin : Abitibi, Québec |
| evergreen a little more intense | 1683 | <u>production process:</u><br>3 g of hornblende + 25 ml nitric acid / soaking: 24 h / drying on hot plate (medium greyish ever- |

| | | |
|---|---|---|
| and luminous than «medium evergreen» | | green [light yellow tone]) / irradiated with electrons at 302,831 rad[45] |
| dark evergreen | 1684 | mineral : crocidolite<br>rock : dark greyish blue<br>powder : pale greyish blue<br>origin : Griqualand district, South Africa<br><br>production process:<br>(followed from «olive-green more intense and accentuated than "olive-green"»)<br>4 g of crocidolite + 100 ml hydrochloric acid / soaking: 2 wk. / drying on hot plate (green [olive-green type]) / irradiated with gamma rays at 550.22 Mrad[239,306] |
| | | mineral : actinolite<br>rock : light and cold evergreen<br>powder : light grey (light green tone)<br>origin : erratic bloc found at Saint-Philémon, near Dorchester, Québec<br><br>production process:<br>rock irradiated with gamma rays at: |
| evergreen a little more accentuated and darker than «light evergreen» | 1685 | 102.704 Mrad[305] |
| ↓ | | |
| evergreen still a little more accentuated and darker | 1686 | 148.4 Mrad |
| ↓ | 1687 | 201.6 Mrad |
| which evolves | 1688 | 244.53 Mrad |
| ↓ towards | 1689 | 247.6 Mrad |
| ↓ | 1690 | 287.3 Mrad |
| ↓ | 1691 | 360 Mrad |
| blackish evergreen | 1692 | 604.53 Mrad |
| evergreen (blue tone) | | |
| | | mineral : fluorine<br>rock : very light and luminous evergreen, translucid<br>origin : Poudrette quarry, Mont Saint-Hilaire, Québec |

| | | |
|---|---|---|
| evergreen (very light blue tone) a little darker than «bluish evergreen a little darker than "very light bluish evergreen"» | 1693 | production process: (followed from «yellowish evergreen») rock irradiated with electrons at 305,200 rad[73] |
| evergreen (yellow tone) | | |
| | 1694 | mineral : fluorine<br>rock : very light and luminous evergreen, translucid<br>origin : Poudrette quarry, Mont Saint-Hilaire, Québec |
| evergreen (very light yellow tone) a little darker than «very light evergreen (yellow tone)» | 1695 | production process: rock irradiated with electrons at 164,800 rad<br>(followed at «evergreen [very light blue tone]») |
| evergreen (brown tone) | | |
| | | mineral : hornblende<br>rock : medium evergreen (light grey tone), with vitreous brilliance<br>powder : medium cold grey (light green tone)<br>origin : Abitibi, Québec<br>production process: powder irradiated with gamma rays at: |
| medium cold grey | 1696 | 5 Mrad |
| (green tone) | 1697 | 10 Mrad |
| \| | 1698 | 57.4 Mrad |
| which darkens and | 1699 | 64.7 Mrad |
| the green tone | 1700 | 148.4 Mrad |
| accentuates | 1701 | 201.6 Mrad |
| \| towards | 1702 | 247.6 Mrad |
| \| | 1703 | 287.3 Mrad |
| ↓ | 1704 | 360 Mrad |
| evergreen | 1705 | 424.7 Mrad |
| (brown tone) | | |

| | | |
|---|---|---|
| evergreen (brown tone) considerably darker than «medium evergreen (brown tone)» | 1706 | production process:<br>rock irradiated with gamma rays at 423.88 Mrad[262] |
| evergreen (grey tone) | | |
| very, very light green (grey tone) | 1707 | mineral : apatite<br>rock : light grass-green (light blue and yellow tones), very slightly translucid<br>powder : very light grey (light green tone)<br>origin : region of Buckingham, Québec<br><br>production process:<br>powder irradiated with gamma rays at 65.704 Mrad (followed at «cold and very light evergreen») |
| greyish evergreen darker and considerably more intense than «medium greyish evergreen» | 1708 | mineral : hornblende<br>rock : medium evergreen (light grey tone), with vitreous brilliance<br>powder : medium cold grey (light green tone)<br>origin : Abitibi, Québec<br><br>production process:<br>3 g of hornblende + 25 ml nitric acid / soaking: 24 h / drying on hot plate (medium greyish evergreen [light yellow tone]) / irradiated with gamma rays at 64.7 Mrad<br><br>(followed at «greyish evergreen [light brown tone]») |
| evergreen (grey and yellow tones) | | |
| medium greyish evergreen (light yellow tone) | 1709 | mineral : hornblende<br>rock : medium evergreen (light grey tone), with vitreous brilliance<br>powder : medium cold grey (light green tone)<br>origin : Abitibi, Québec<br><br>production process:<br>3 g of hornblende + 25 ml nitric acid / soaking: 24 h / drying on hot plate |
| evergreen (grey and brown tones) | | |
| | | mineral : hornblende<br>rock : medium evergreen (light grey tone), with vitreous brilliance |

| | | |
|---|---|---|
| greyish evergreen (light brown tone), more intense than «greyish evergreen more intense and dark than "medium greyish evergreen"» | 1710 | powder : medium cold grey (light green tone)<br>origin : Abitibi, Québec<br><br>production process:<br>3 g of hornblende + 25 ml nitric acid / soaking: 24 h / drying on hot plate (medium greyish evergreen [light yellow tone]) / irradiated with gamma rays at 424.7 Mrad |
| phtalo-green[217a] | | |
| pale phtalo-green | 1711 | mineral : bornite<br>rock : reddish brown (with localized green and bluish green oxidation)<br>powder : reddish brown<br>origin : Lac Musset, Fosse du Labrador, Québec<br><br>production process:<br>(followed from «pale apple-green» and «light and very vivid azure-blue»)<br>1 g of bornite + 40 ml nitric acid / soaking: 6 d. / separation of the liquid and the solid / natural drying / colour of the solid<br>(followed at «medium phtalo-green») |
| phtalo-green more pale than «light phtalo-green» | 1712 | production process:<br>2 g of bornite + 15 ml hydrochloric acid + 10 ml nitric acid / soaking: 6 d. / separation of the liquid and the solid / natural drying (colour of the solid: mixture of particles: light phtalo-green / intense phtalo-green) / irradiated with gamma rays at 65.65 Mrad<br>(followed at «medium beige [orange tone]») |
| light phtalo-green | 1713 | mineral : agate<br>rock : grey (with a light orange circular area on the surface), slightly translucid<br>powder : very light grey<br>origin : unknown<br><br>production process:<br>3 g of agate + 40 ml nitric acid / soaking: 1 wk. / separation of the liquid and the solid / natural drying (colour of the liquid: medium greenish turquoise) / irradiated with gamma rays at 64.7 Mrad<br>(followed at «mixture of particles: beige / brown») |

| | | |
|---|---|---|
| light and acute phtalo-green | 1714 | mineral : bornite<br>rock : reddish brown (with localized green and bluish green oxidation)<br>powder : reddish brown<br>origin : Lac Musset, Fosse du Labrador, Québec<br><br>production process:<br>(followed from «light and very vivid azure-blue») 1 g of bornite + 50 ml hydrochloric acid / soaking: 6 d. / separation of the liquid and the solid / natural drying / colour of the liquid (followed at «intense emerald-green», at «very, very vivid apple-green» and «lime-green still more intense than "very, very acute lime-green"») |
| | 1715 | mineral : green grossular garnet<br>rock : light and luminous phtalo-green[217a]<br>origin : Jeffrey Mine, Asbestos (today J.-M. Asbestos), Québec<br><br>production process:<br>rock[310] irradiated with gamma rays[67] at: |
| phtalo-green more accentuated and dark than «light phtalo-green» | 1716 | 64.7 Mrad |
| ↓ | | |
| phtalo-green still more accentuated and dark | 1717 | 102.4 Mrad |
| ↓ | | |
| phtalo-green still more accentuated and dark | 1718 | 148.7 Mrad |
| ↓ | | |
| phtalo-green still more accentuated and dark | 1719 | 201.6 Mrad |
| ↓ | | |
| phtalo-green still more accentuated and dark | 1720 | 247.6 Mrad |
| ↓ | | |
| phtalo-green considerably more accentuated | 1721 | 287.3 Mrad<br><br>(followed at «dark phtalo-green [light brown tone]») |
| | | mineral : chrysocolla<br>rock : light greenish turquoise<br>powder : very light greenish turquoise |

| | | |
|---|---|---|
| phtalo-green | 1722 | origin : Mexico<br><br>production process:<br>(followed from «greenish turquoise darker than "light greenish turquoise"»)<br>granules irradiated with gamma rays at 360 Mrad[311] |
| phtalo-green | 1723 | mineral : granite gneiss<br>rock : reddish beige<br>powder : medium pink (light brown tone)<br>origin : Lac Beauport, region of the city of Québec, Québec<br><br>production process:<br>2 g of gneiss + 2 g of sodium carbonate / 0↑1700 °F + 1 h at 1700 °F (pale emerald-green) / irradiated with electrons at 162,431 rad<br>(followed at «very, very pale green») |
| phtalo-green | 1724 | mineral : smaltite[25], variety of skutterudite<br>rock : dark iron-grey, with silver metallic brilliance<br>powder : dark grey<br>origin : Cobalt, Ontario<br><br>production process:<br>3 g of smaltite + 80 ml hydrochloric acid / soaking: 2 wk. / separation of the liquid and the solid / drying on hot plate (colour of the solid: khaki-green) / irradiated with gamma rays at 64.7 Mrad<br>(followed at «very dark grass-green, almost black») |
| phtalo-green more intense than «phtalo-green» | 1725 | mineral : copper<br>rock : reddish brown, with metallic luster<br>powder : reddish brown, with metallic luster<br>origin : unknown<br><br>production process:<br>(followed from «mint-green [malachite-green type]»)<br>100 g of copper + 100 ml hydrochloric acid / soaking: 5 mo. / natural drying (mint-green [malachite-green type]) / 0↑450 °F (mint-green [malachite-green type] a little darker than «mint-green [malachite-green type]») / irradiated with gamma rays at 424.7 mrad |
| | | mineral : bornite<br>rock : reddish brown (with localized green and bluish green oxidation)<br>powder : reddish brown<br>origin : Lac Musset, Fosse du Labrador, Québec |

| | | |
|---|---|---|
| phtalo-green considerably more intense than «phtalo-green» | 1726 | production process:<br>2 g of bornite + 25 ml nitric acid / soaking: 6 d. / separation of the liquid and the solid / natural drying (colour of the solid: mossy green) / irradiated with gamma rays at 65.65 Mrad<br>(followed at «apple-green [yellow tone and orange reflection]») |
| medium phtalo-green | 1727 | production process:<br>(followed from «intense and dark phtalo-green» and «pale phtalo-green»)<br>1 g of bornite + 50 ml nitric acid / soaking: 6 d. / separation of the liquid and the solid / natural drying / colour of the solid[312]<br>(followed at «pale apple-green» and «intense and dark phtalo-green») |
| vivid phtalo-green | 1728 | production process:<br>(followed from «light emerald-green»)<br>2 g of bornite + 15 ml hydrochloric acid + 10 ml nitric acid / soaking: 6 d. / separation of the liquid and the solid / natural drying / colour of the liquid[186,313]<br>(followed at «mixture of particles: light phtalo-green / intense phtalo-green» and «mixture of particles: bluish green / light and vivid apple-green») |
| intense phtalo-green | 1729 | mineral : chalcopyrite<br>rock : brass-yellow, with metallic luster<br>powder : dark grey (with golden particles)<br>origin : Noranda Mines, Noranda, Abitibi, Québec<br><br>production process:<br>(followed from «medium khaki-green» and «intense phtalo-green»)<br>rock irradiated with gamma rays at 65 Mrad / grinding / 1 g of irradiated powder + 40 ml nitric acid / natural drying / colour of the liquid[24]<br>(followed at «vivid apple-green») |
| very intense phtalo-green | 1730 | production process:<br>1 g of chalcopyrite + 40 ml nitric acid / natural drying / colour of the liquid<br>(followed at «medium khaki-green») |
| | | mineral : copper<br>rock : reddish brown, with metallic luster<br>powder : reddish brown, with metallic luster<br>origin : unknown |

277

| | | |
|---|---|---|
| very intense and vivid phtalo-green | 1731 | <u>production process:</u><br>rock entirely covered with 1000 ml acetic acid / natural drying / removal of the crystals formed at the surface of the rock (the colour of the crystals: pronounced emerald-green): 1 g of crystals + 4 ml ammonia / natural drying (very intense blue-violet tone): .2 g + 50 cc of transparent polyester resin + 1% of catalyst / manual grinding / moulding / hardening (vivid emerald-green) / irradiated with gamma rays at 5.7 Mrad |
| very intense phtalo-green | 1732 | mineral : bornite<br>rock : reddish brown (with localized green and bluish green oxidation)<br>powder : reddish brown<br>origin : Lac Musset, Fosse du Labrador, Québec<br><br><u>production process:</u><br>2 g of bornite + 25 ml nitric acid / soaking: 6 d. / separation of the liquid and the solid / natural drying (colour of the liquid: vivid and dark emerald-green) / irradiated with gamma rays at 425.65 Mrad |
| phtalo-green more intense and vivid than «very intense phtalo-green» | 1733 | mineral : chalcocite<br>rock : dark iron-grey (with localized turquoise oxidation)<br>powder : dark iron-grey<br>origin : Butte, Montana, United States<br><br><u>production process:</u><br>4 g of chalcocite+20 ml nitric acid / soaking: 2 wk. / separation of the 1st liquid and the solid / desiccation of the 1st liquid (colour of the 1st liquid: very intense emerald-green) / addition to the same solid of 100 ml nitric acid / soaking: 2 wk. / separation of the 2nd liquid and the solid / desiccation of the 2nd liquid (colour of the 2nd liquid: mixture of particles: very vivid blue / acute greenish turquoise) / natural drying of the solid (colour of the solid: intense green [between "grass-green" and "Paris green"]) / the 1st liquid is irradiated with gamma rays at 424.7 Mrad[a1] |
| | | mineral : bornite<br>rock : reddish brown (with localized green and bluish green oxidation)<br>powder : reddish brown<br>origin : Lac Musset, Fosse du Labrador, Québec |

| | | |
|---|---|---|
| intense and dark phtalo-blue | 1734 | production process: (followed from «light and very vivid azure-blue») 1 g of bornite + 50 ml nitric acid / soaking: 6 d. / separation of the liquid and the solid / natural drying / colour of the liquid[24,186] (followed at «emerald-green» and «medium phtalo-green») |
| mixture of particles | | |
| light phtalo-green / intense phtalo-green | 1735 | mineral : bornite<br>rock : reddish brown (with localized green and bluish green oxidation)<br>powder : reddish brown<br>origin : Lac Musset, Fosse du Labrador, Québec<br><br>production process: (followed from «vivid phtalo-green» and «very light yellowish green») 2 g of bornite + 25 ml hydrochloric acid + 10 ml nitric acid / soaking: 6 d. / separation of the liquid and the solid / natural drying / colour of the solid[314]<br><br>(followed at «mixture of particles: light green / accentuated green») (followed from «very vivid medium emerald-blue» and «mixture of particles: light green / accentuated green») |
| medium phtalo-green / intense greenish blue | 1736 | 2 g of bornite + 5 ml hydrochloric acid + 20 ml nitric acid / soaking: 6 d. / separation of the liquid and the solid / natural drying / colour of the solid[315] (followed at «mossy green») |
| phtalo-green[217a] (mint-green tone) | | |
| phtalo-green (light mint-green tone) considerably more intense than «vivid phtalo-green (mint-green tone)» | 1737 | mineral : bornite<br>rock : reddish brown (with localized green and bluish green oxidation)<br>powder : reddish brown<br>origin : Lac Musset, Fosse du Labrador, Québec<br><br>production process: 2 g of bornite + 15 ml hydrochloric acid + 10 ml nitric acid / soaking: 6 d. / separation of the liquid and the solid / natural drying (colour of the liquid: vivid phtalo-green) / irradiated with gamma rays at 65.65 Mrad<br><br>(followed at «medium apple-green [yellow tone]») |

| | | |
|---|---|---|
| phtalo-green[217a] (beige tone) | | |
| phtalo-green (beige tone) more accentuated and darker than «pale phtalo-green (beige tone)» | 1738 | mineral : bornite<br>rock : reddish brown (with localized green and bluish green oxidation)<br>powder : reddish brown<br>origin : Lac Musset, Fosse du Labrador, Québec<br><br>production process:<br>1500 °F / 1 h (medium reddish brown): 1 g + 40 ml hydrochloric acid / soaking: 14 d. / separation of the liquid and the solid / natural drying (colour of the liquid: «greenish pastel blue» crystals on a «pale phtalo-green» layer of powder) / irradiated with gamma rays at 65.65 Mrad (followed at «brownish grey [light green reflection]») |
| phtalo-green[217a] (brown tone) | | |
| | | mineral : green grossular garnet<br>rock : light and luminous phtalo-green[217a]<br>origin : Jeffrey Mine, Asbestos (today J.-M. Asbestos), Québec<br><br>production process:<br>(followed from «phtalo-green more accentuated than "light phtalo-green"»)<br>rock irradiated with gamma rays at: |
| dark phtalo-green (light brown tone) ↓ | 1739 | 360 Mrad |
| phtalo-green (brown tone a little more accentuated) slightly darker | 1740 | 424.7 Mrad |
| green [between «phtalo-green[217a]» and «olive-green»] | | |
| green [between «phtalo-green» | 1741 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed at «olive-green»)<br>2 g of molybdenite + 2 g of sodium carbonate / 0↑1700 °F + 1 h at 1700 °F |

| | | |
|---|---|---|
| and «olive-green» | | (followed at «light azure-blue») |
| green [between «phtalo-green» and «olive-green»] | 1742 | mineral : ochre[20]<br>powder : orange<br>origin : small copper and nickel deposit in the South-Western area of a mass of serpentinite at 3 km at the West of Saint-Fabien-de-Panet, Québec<br><br>production process:<br>1 g of ochre + 2 g of sodium carbonate / 0↑1800 °F |
| grass-green | | |
| very pale grass-green | 1743 | mineral : graphite<br>rock : dark grey, with metallic brilliance<br>powder : dark grey, with metallic brilliance<br>origin : Grenville, Québec<br><br>mineral : sulphur<br>rock : brilliant yellow<br>powder : brilliant yellow<br>origin : unknown<br><br>mineral : cement[1138]<br>powder : white<br><br>production process:<br>1 g of graphite + 1 g of sodium carbonate + 1 g of sulphur + 27.40 g of cement + 13 cc of water / manual grinding / moulding / hardening / 0↑1900 °F[316] |
| very pale grass-green | 1744 | mineral : pyrophyllite<br>rock : light beige (pink and grey tones), opaque<br>powder : very light beige (grey and orange-pink tones)<br>origin : Carpentier district, Abitibi, Québec<br><br>production process:<br>2 g of pyrophyllite + 2 g of sodium carbonate / 0↑1600 °F + 1 h at 1600 °F (light greenish blue [grey tone]) / irradiated with gamma rays at 63.88 Mrad |
| | | mineral : copper<br>rock : reddish brown, with metallic luster<br>powder : reddish brown, with metallic luster<br>origin : unknown |

| | | |
|---|---|---|
| grass-green a little lighter than «very light grass-green» | 1745 | production process: rock entirely covered with 1000 ml acetic acid / natural drying / removal of the crystals formed at the surface of the rock (the colour of the crystals: pronounced emerald green): 5 g of crystals + 25 ml ammonia / natural drying (very intense blue [violet tone]): 1 g + 1 cc of white opaque printing ink / manual grinding / 1 impression on white frosted paper (very light grass-green [grey tone]) / irradiated with gamma rays at 22.8 Mrad[317] |
| grass-green considerably more pale and cold [less yellowish] than «light grass-green» | 1746 | mineral : chromite[294,319]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process: .50 g of chromite + 1.50 g of calcite / 0↑1900 °F (light grass-green) / irradiated with gamma rays at 64.7 Mrad<br><br>(followed at «green [beige tone]») |
| grass-green more pale than «light grass-green» | 1747 | mineral : calcite[11,318,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process: 1.50 g of calcite + .50 g of chrome / 1650 °F / 1 h (light grass-green) / irradiated with gamma rays at 190.22 Mrad<br>(followed at «green [beige tone] more pale than "light green [beige tone]"») |
| grass-green more | 1748 | production process: 1.50 g of calcite + .50 g of chrome / 1650 °F / 1 |

| | | |
|---|---|---|
| pale than «light grass-green» | | h (light grass-green) / irradiated with electrons at 302,831 rad[36] |
| grass-green a little more pale than «light grass-green» | 1749 | mineral : chromite[294,319]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br><u>production process:</u><br>.50 g of chromite + 1.50 g of calcite / 0†1900 °F (light grass-green) / irradiated with electrons at 302,831 rad[36] |
| light pastel grass-green | 1750 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process:</u><br>.50 g of asbestos + .50 g of sulphur / grinding |
| | | mineral : calcite[11]<br>powder : white<br>origin : Calcite du Nord Company, Saint-Eugène de Mistassini, Lac Saint-Jean, Québec<br><br>mineral : chromite[294,319]<br>rock : dark grey<br>powder : dark grey<br>origin : Black Lake, Eastern Townships, Québec<br><br><u>production process:</u><br>(followed from «light greenish grey») |
| light grass-green | 1751 | 1.50 g of calcite + .25 g of chromite / 1000 °C / 2 h |
| light grass-green | 1752 | 1.50 g of calcite + .50 g of chromite / 1000 °C / 2 h |

| | | |
|---|---|---|
| light grass-green | 1753 | 1.50 g of calcite + .75 g of chromite / 1000 °C / 2 h |
| ↓ | | |
| light grass-green | 1754 | 1.50 g of calcite + 1 g of chromite / 1000 °C / 2h (followed at «dark grass-green» and «grass-green [blue tone]») |
| light grass-green | 1755 | production process: 1.50 g of calcite + .50 g of chromite / 1850 °F / 1 h |
| light grass-green | 1756 | production process: 1.50 g of calcite + .50 g of chromite / 0↑1900 °F |
| | | mineral : calcite[11,318,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process: |
| light grass-green | 1757 | 1 g of calcite + 1 g of chrome + 1 g of MgO / 1700 °F / 1 h |
| ↓ | | |
| light grass-green | 1758 | 1 g of calcite + 1 g of chrome + 1 g of MgO / 1800 °F / 1 h (followed at «medium grass-green [light brown tone]») |
| | | production process: (followed from «light grass-green [light yellow tone]») |
| light grass-green | 1759 | 1.50 g of calcite + .50 g of chrome / 1600 °F / 1h |
| light grass-green | 1760 | 1.50 g of calcite + .15 g of chrome / 1625 °F / 1h |
| light grass-green | 1761 | 1.50 g of calcite + .25 g of chrome / 1625 °F / 1h |
| light grass-green | 1762 | 1.50 g of calcite + .35 g of chrome / 1650 °F / 1h |
| light grass-green | 1763 | 1.50 g of calcite + .50 g of chrome / 1650 °F / 1h |
| light grass-green | 1764 | 1.50 g of calcite + .40 g de chrome / 1675 °F / 1h |

| | | |
|---|---|---|
| grass-green more accentuated than «light grass-green» ↓ | 1765 | 1.50 g of calcite + .25 g of chrome / 1650 °F / 1 h |
| grass-green still more accentuated | 1766 | 1.50 g of calcite + .50 g of chrome / 1675 °F / 1 h (followed at «grass-green [very light blue tone]») |
| | | mineral : chromite[294,319]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process:<br>(followed from «dark grass-green») |
| light grass-green | 1767 | 1.50 g of chromite + .25 g of calcite / 1000 °C / 2 h[320,321,322] |
| grass-green darker than «light grass-green» ↓ | 1768 | 1.50 g of chromite + .50 g of calcite / 1000 °C / 2 h |
| grass-green still darker | 1769 | 1.50 g of chromite + 1 g of calcite / 1000 °C / 2 h |
| | | mineral : cement[82]<br>powder : medium cold grey<br>origin : Union des Carrières, Limoilou, Québec<br><br>mineral : chromite[294]<br>rock : dark grey<br>powder : dark grey<br>origin : Black Lake, Eastern Townships, Québec<br><br>production process:<br>(followed from «medium mossy grass-green») |
| light grass-green | 1770 | 1.50 g of cement + .25 g of chromite / 1000 °C / 2 h[320,321] |
| | | production process: |
| light grass-green ↓ | 1771 | 1.50 g of cement + .25 g of chromite / 1525 °F / 1 h |

285

| | | |
|---|---|---|
| light grass-green | 1772 | 1.50 g of cement + .25 g of chromite / 1675 °F / 1 h |
| light grass-green<br>↓<br>light grass-green | 1773<br><br>1774 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «light green»)<br>1.50 g of cement + .25 g of chrome / 1525 °F / 1 h<br><br>(followed at «green more pronounced than "light green"»)<br>(followed from «grass-green more accentuated than "light grass-green"»)<br><br>1.50 g of cement + .15 g of chrome / 1675 °F / 1 h<br>(followed at «grass-green [light yellow tone]») |
| light pastel grass-green | 1775 | mineral : chromite[294]<br>rock : dark grey<br>powder : dark grey<br>origin : Black Lake, Eastern Townships, Québec<br><br>mineral : mussel shell or calcium carbonate<br>shell : dark indigo-blue (violet tone)<br>powder : white<br>origin : St.-Lawrence river, Baie-des-Chaleurs, Gaspésie, Québec<br><br>production process:<br>.50 g of chromite + 1.50 g of shell powder / 0↑1900 °F |
| light grass-green | 1776 | mineral : copper concentrate (Cu-FeS)<br>powder : medium chocolate-brown (grey tone)<br>origin : Centre de recherche des Mines Noranda, Montréal, Québec<br><br>production process:<br>4 g of concentrate + 50 ml sulphuric acid / soaking: 4 wk. / drying on hot plate |
| | | mineral : malachite<br>rock : ribboned variety of pronounced mint-green<br>powder : light and brilliant mint-green |

| | | |
|---|---|---|
| | | origin : Katanga province, at 300 km from Lubumbachai, Zaïr, Africa<br><br>production process:<br>(followed from «bluish green»)<br>2 g of dolomite + 2 g of sodium carbonate / 0↑1900 °F + 1 h at 1900 °F (apple-green a little more pronounced than «pale apple-green») / irradia-ted with gamma rays at 424.7 Mrad |
| light grass-green | 1776.1 | |
| light grass-green | 1777 | mineral : dolomite<br>rock : white (localized yellow reflection), crystalline and translucid<br>powder : white<br>origin : Bristol district, Pontiac county, Québec<br><br>production process:<br>(followed from «bluish green»)<br>2 g of dolomite + 2 g of sodium carbonate / 0↑1900 °F + 1 h at 1900 °F (apple-green a little more pronounced than «pale apple-green») / irra-diated with gamma rays at 424.7 Mrad |
| light and intense vegetable-green | 1778 | mineral : hornblende<br>rock : medium evergreen (light grey tone), with vitreous brilliance<br>powder : medium cold grey (light green tone)<br>origin : Abitibi, Québec<br><br>production process:<br>20 g of hornblende + 100 ml hydrochloric acid / soaking: 5 mo. / natural drying |
| light grass-green (accentuated green tone) | 1779 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>.50 g of asbestos + .50 g of sulphur (light pastel grass-green) / irradiated with gamma rays at 63.984 Mrad<br>(followed at «medium brown [orange tone and green reflection]») |
| | | mineral : andulusite<br>rock : light brownish grey |

287

| | | |
|---|---|---|
| | | powder : light grey<br>origin : Bimbowrie, South Australia<br><br>production process:<br>(followed from «mixture of particles: grass-green / orange»)<br>2 g of andulusite + 2 g of sodium carbonate: |
| light grass-green | 1780 | 0↑1500 °F + 45 min. at 1500 °F |
| ↓ | | |
| grass-green more accentuated than «light grass-green» | 1781 | 0↑1500 °F + 1 h at 1500 °F<br><br>(followed at «greenish turquoise») |
| | | mineral : peridotite<br>rock : medium grey<br>powder : medium brownish grey (green reflection)<br>origin : Thetford Mines, Québec<br>production process:<br>(followed from «beige [green tone]»)<br>2 g of peridotite + 2 g of sodium carbonate: |
| light grass-green | 1782 | 0↑1600 °F + 1 h at 1600 °F |
| green grass a little more accentuated than «light grass-green» | 1783 | 0↑1700 °F + 1 h at 1700 °F |
| grass-green still more accentuated | 1784 | 0↑1800 °F + 1 h at 1800 °F |
| ↓ | | |
| grass-green still more accentuated | 1785 | 0↑1900 °F + 1 h at 1900 °F |
| | | production process:<br>(followed from «beige [light green tone]»)<br>2 g of peridotite + 2 g of sodium carbonate: |
| light grass-green | 1786 | 0↑1600 °F |
| grass-green a little more accentuated | 1787 | 0↑1700 °F |
| grass-green still more accentuated | 1788 | 0↑1800 °F |

| | | |
|---|---|---|
| ↓<br>grass-green still more accentuated | 1789 | 0↑1900 °F |
| | | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «medium and intense grass-green») |
| light grass-green | 1790 | 1.50 g of cement + .10 g of chrome / 1650 °F / 1 h |
| ↓<br>grass-green more accentuated than «light grass-green» | 1791 | 1.50 g of cement + .15 g of chrome / 1650 °F / 1 h<br><br>(followed at «light grass-green») |
| | | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «beige [light green tone]» and «medium grass-green») |
| light grass-green | 1792 | 1.50 g of cement + .50 g of chrome / 1600 °F / 1 h |
| \|<br>grass-green (green tone more accentuated) | 1793 | 1.50 g of cement + .10 g of chrome / 1625 °F / 1 h |
| \|<br>more accentuated grass-green | 1794 | 1.50 g of cement + .15 g of chrome / 1625 °F / 1 h |
| ↓<br>grass-green still more accentuated | 1795 | 1.50 g of cement + .10 g of chrome / 1650 °F / 1 h<br>(followed at «intense grass-green» and «light olive-green») |
| | | mineral : serpentine<br>rock : yellowish green<br>powder : light greenish yellow<br>origin : probably Thetford Mines, Eastern Townships, Québec |

289

| | | |
|---|---|---|
| light grass-green<br>↓<br>grass-green [between «light grass-green» and «medium grass-green»]<br>↓<br>grass-green still more accentuated | 1796<br><br>1797<br><br>1798 | <u>production process:</u><br>(followed from «beige [green tone]»)<br>2 g of serpentine + 2 g of sodium carbonate:<br>0↑1700 °F + 1 h at 1700 °F<br><br>0↑1800 °F + 1 h at 1800 °F<br><br>0↑1900 °F + 1 h at 1900 °F |
| light grass-green<br>↓<br>grass-green [between «light grass-green» and «medium grass-green»] | 1799<br><br>1800 | <u>production process:</u><br>2 g of serpentine + 2 g of potassium carbonate:<br>0↑1700 °F<br><br>0↑1800 °F |
| grass-green a little more accentuated than «light grass-green» | 1801 | mineral : cement[269]<br>powder : medium brownish grey<br>origin : CALCO, Charlesbourg, Québec<br><br>mineral : chrome<br>powder : light grey, with metallic brilliance<br><br><u>production process:</u><br>1.50 g of cement + .25 g of chrome / 1525 °F / 1 h (light grass-green) / irradiated with gamma rays at 64.7 Mrad<br>(followed at «mat olive-green») |
| | | mineral : mussel shell or calcium carbonate<br>shell : dark indigo-blue (violet tone)<br>powder : white<br>origin : St.-Lawrence river, Baie-des-Chaleurs, Gaspésie, Québec<br><br>mineral : chromite[294] |

| | | |
|---|---|---|
| grass-green more green and luminous, more accentuated than «light grass-green» | 1802 | rock : dark grey<br>powder : dark grey<br>origin : Black Lake, Eastern Townships, Québec<br><br>production process:<br>1.50 g of shell powder + .50 g of chromite / 0↑1900 °F (light pastel grass-green) / irradiated with electrons at 302,831 rad[36] |
| grass-green a little darker and cold [less yellow] than «light grass-green» | 1803 | production process:<br>1.50 g of shell powder + .50 g of chromite / 0↑1900 °F (light pastel grass-green) / irradiated with gamma rays at 64.7 Mrad<br><br>(followed at «medium and cold pastel grass-green») |
| grass-green more pale than «grass-green» | 1804 | mineral : cement[269]<br>powder : medium brownish grey<br>origin : CALCO, Charlesbourg, Québec<br><br>mineral : chrome<br>powder : light grey, with metallic brilliance<br><br>production process:<br>1.50 g of cement + .50 g of chrome / 1900 °F / 1 h (cold grass-green): .25 g + 20 ml ammonia / natural drying |
| grass-green | 1805 | mineral : amazonite<br>rock : light greenish turquoise<br>powder : white (turquoise reflection)<br>origin : Lac Sairs, Témiscamingue, Québec<br><br>production process:<br>rock entirely covered with 20 ml hydrochloric acid / soaking: 2 wk. / irradiated with gamma rays at 5.7 Mrad / drying on sand bath, completed on hot plate[323] |
| grass-green | 1806 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml nitric acid / soaking: 2 wk. / separation of the 1st liquid and the solid / desiccation of the 1st liquid (colour of the 1st liquid: very intense emerald-green) / addition to the same solid of 100 ml nitric acid / soaking: 2 |

| | | |
|---|---|---|
| | | wk. / separation of the 2nd liquid and the solid / desiccation of the 2nd liquid (colour of the 2nd liquid: mixture of particles: very vivid blue / acute greenish turquoise) / natural drying of the solid (colour of the solid: intense green [between «grass-green» and «Paris green »]) / the solid is irradiated with gamma rays at 64.7 Mrad (followed at «olive-green [yellow tone]») |
| grass-green | 1807 | mineral : cement[269]<br>powder : medium brownish grey<br>origin : CALCO, Charlesbourg, Québec<br><br>mineral : chromite[294,320,321]<br>rock : dark grey<br>powder : dark grey<br>origin : Black Lake, Eastern Townships, Québec<br><br>production process:<br>(followed from «light greenish grey» and «greenish grey»)<br>1.50 g of cement + .50 g of chromite / 1000 °C / 2 h[324]<br>(followed at «light greenish grey», at «medium mossy brownish green» and «greenish brown») |
| grass-green | 1809 | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br>production process:<br>(followed from «medium mossy grass-green»)<br>.50 g of chromite + 1.50 g of cement / 1000 °C / 1 h[320,321,325] |
| grass-green | 1810 | mineral : chromite[294]<br>rock : dark grey<br>powder : dark grey<br>origin : Black Lake, Eastern Townships, Québec<br><br>mineral : cement[1138]<br>powder : white<br><br>production process:<br>(followed from «grey [localized grass-green tone]»)<br>1 g of chromite + 27.40 g of cement + 13 cc of water / manual grinding / moulding / hardening / 0↑1900 °F |

| | | |
|---|---|---|
| grass-green | 1811 | mineral : cement[269]<br>powder : medium brownish grey<br>origin : CALCO, Charlesbourg, Québec<br><br>mineral : chrome<br>powder : light grey, with metallic brilliance<br><br>production process:<br>1 g of cement + 1 g of chrome / 2000 °F / 45 min. |
| grass-green | 1812 | mineral : mussel shell or calcium carbonate<br>shell : dark indigo-blue (violet tone)<br>powder : white<br>origin : St.-Lawrence river, Baie-des-Chaleurs, Gaspésie, Québec<br><br>mineral : chrome<br>powder : light grey, with metallic brilliance<br><br>production process:<br>1.50 g of shell powder + .50 g of chrome / 1900 °F / 1 h<br>(followed at «vivid grass-green») |
| green [grass-green type] | 1813<br>1814 | mineral : hypersthene<br>rock : black<br>powder : medium brownish grey<br>origin : Lac Saint-Jean, Québec<br><br>production process:<br>(followed at «olive-green»)<br>2 g of hypersthene + 2 g of sodium carbonate / 0↑1800 °F + 1 h at 1800 °F<br>(followed at «grass-green [light brown tone]») |
| grass-green | 1815 | mineral : quartz - mica[96]<br>powder : light cream (light yellow tone)<br>origin : small copper and nickel deposit in the South-Western area of a mass of serpentinite at 3 km at the West of Saint-Fabien-de-Panet, Québec<br><br>production process:<br>60 g of quartz - mica + 100 ml phosphoric acid / soaking: 3 wk. / drying on hot plate (still humid) |
| | | mineral : obsidian<br>rock : very dark smok y grey, almost black<br>powder : light grey |

293

| | | |
|---|---|---|
| | | origin : Arkansas, United States<br><br>production process:<br>(followed from «green»)<br>2 g of obsidian + 2 g of sodium carbonate: |
| grass-green<br>↓ | 1816 | 0↑1800 °F + 1 h at 1800 °F |
| grass-green | 1817 | 0↑1900 °F + 1 h at 1900 °F |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process: |
| grass-green | 1818 | .50 g of wilsonite + 2 g of sodium carbonate / 0↑1600 °F + 1 h at 1600 °F[326] |
| | | production process:<br>(followed from «bluish turquoise») |
| grass-green | 1819 | .50 g of wilsonite + 2 g of sodium carbonate / 1600 °F / 1 h |
| | | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «pronounced grass-green [mitigated yellow tone]») |
| cold grass-green<br>↓ | 1820 | 1.50 g of cement + .50 g of chrome / 1900 °F / 1 h[327] |
| more acute cold grass-green | 1821 | 1.50 g of cement + .50 g of chrome / 2000 °F / 1 h (followed at «accentuated and vivid grass-green» and at «dark greyish brown [green reflection]») |
| | | mineral : cement[82]<br>powder : medium cold grey<br>origin : Union des Carrières, Limoilou, Québec<br><br>mineral : chrome<br>powder : light grey, with metallic brilliance<br><br>production process:<br>(followed at «yellowish green») |

| | | |
|---|---|---|
| grass-green | 1822 | 1 g of cement + .50 g of chrome / 1700 °F / 1 h |
| ↓ | | |
| grass-green lighter and colder than «grass-green» | 1823 | 1 g of cement + .25 g of chrome / 1700 °F / 1 h |
| ↓ | | |
| grass-green still lighter and colder | 1824 | 1 g of cement + .10 g of chrome / 1700 °F / 1 h |
| | | production process: (followed from «green of various tones which evolves towards "yellowish green"») |
| grass-green of various tones | 1825 | .50 g of cement + 1.50 g of chrome / 1700 °F / 1 h |
| | 1826 | .50 g of cement + 1 g of chrome / 1700 °F / 1 h |
| | 1827 | .50 g of cement + .50 g of chrome / 1700 °F / 1 h |
| | 1828 | .50 g of cement + .25 g of chrome / 1700 °F / 1 h |
| ↓ | 1829 | .50 g of cement + .10 g of chrome / 1700 °F / 1 h |
| | | mineral : tremolite<br>rock : medium brown (evergreen tone)<br>powder : greyish beige<br>origin : Tetreault Mine, Montauban, Portneuf county, Québec |
| | | production process: (followed from «beige [green tone]» and «very vivid emerald-green [blue tone]»)<br>2 g of tremolite + 2 g of sodium carbonate: |
| grass-green | 1830 | 0↑1500 °F + 1 h at 1500 °F |
| | 1831 | 0↑1600 °F + 1 h at 1600 °F |
| of | 1832 | 0↑1700 °F + 1 h at 1700 °F |
| ↓ | 1833 | 0↑1800 °F + 1 h at 1800 °F |
| various tones | 1834 | 0↑1900 °F + 1 h at 1900 °F |
| | | production process: (followed from «brownish beige [grey tone]»)<br>2 g of tremolite + 2 g of sodium carbonate: |
| grass-green | 1835 | 0↑1600 °F |
| ↓ | | |

| | | |
|---|---|---|
| ↓ of<br>various tones | 1836 | 0↑1700 °F |
| | 1837 | 0↑1800 °F |
| grass-green | | <u>production process:</u><br>(followed from «grass- green of various tones») |
| grass-green | 1838 | 1 g of tremolite + .50 g of sodium carbonate / 1600 °F / 1 h |
| of | 1839 | 1 g of tremolite + 2 g of sodium carbonate / 1600 °F / 1 h |
| ↓ various tones | 1840 | 1 g of tremolite + 2.50 g of sodium carbonate / 1600 °F / 1 h |
| | | mineral : shale (formation of Sillery)[547]<br>rock : dark «mars-violet»[753]<br>powder : light «mars-violet»<br>origin : small copper and nickel deposit in South-Western area of a mass of serpentinite at 3 km at the West of Saint-Fabien-de-Panet, Québec |
| grass-green (with olive-green reflection) | 1840.1 | <u>production process:</u><br>1% of shale is mixed with molten glass (crystal) and the entirety is melted at 2,400 °F |
| | | mineral : chrome<br>powder : light grey, with metallic brilliance<br><br>mineral : cement[459]<br>powder : grey<br>origin : Lafarge Canada Inc., Montréal, Québec<br><br><u>production process:</u><br>(followed from «pale green»)<br>1 g of chrome + 27.40 g of cement + 13 cc of water / manual grinding / moulding / hardening: |
| grass-green | 1841 | 0↑1600 °F |
| more accentuated grass-green | 1842 | 0↑1700 °F |
| still more accentuated grass-green | 1843 | 0↑1800 °F |
| still more accentuated grass-green | 1844 | 0↑1900 °F |

296

| | | |
|---|---|---|
| ↓ still more accentuated grass-green | 1845 | 0↑1950 °F |
| grass-green more pale, less brown than «medium grass-green» | 1846 | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br>production process:<br>.50 g of chromite + 1.50 g of cement / 1000 °C / 2 h (medium mossy grass-green) / irradiated with electrons at 302,831 rad[45] |
| grass-green lighter than «medium grass-green» | 1847 | mineral : cryolite[328]<br>rock : white, crystalline and translucid<br>powder : white<br>origin : Ivigtut, Groenland<br><br>mineral : chrome<br>powder : light grey, with metallic brilliance<br><br>production process:<br>3 g of cryolite + 2 g of chrome / 1700 °F / 1 h (followed at «dark and accentuated grass-green [blue tone]») |
| medium pastel and cold grass-green [mitigated | 1848 | mineral : mussel shell or calcium carbonate<br>shell : dark indigo-blue (violet tone)<br>powder : white<br>origin : St.-Lawrence river, Baie-des-Chaleurs, Gaspésie, Québec<br><br>mineral : chromite[294]<br>rock : dark grey<br>powder : dark grey<br>origin : Black Lake, Eastern Townships, Québec<br><br>production process:<br>(followed from «grass-green a little darker and cold than "light grass-green"»)<br>1.50 g of shell powder + .50 g of chromite / 0↑1900 °F (light pastel grass-green) / irradiated with gamma rays at 424.7 Mrad[329] |

| | | |
|---|---|---|
| yellow tone] | | |
| medium grass-green | 1849 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «light greenish turquoise»)<br>50 g of asbestos + 200 ml hydrochloric acid or asbestos entirely covered with hydrochloric acid / soaking: 1 wk. / drying on hot plate (vivid yellow): 3 g + 4 g of sodium carbonate / 0↑1900 °F |
| medium grass-green | 1850 | mineral : chromite[294]<br>rock : dark grey<br>powder : dark grey<br>origin : Black Lake, Eastern Townships, Québec<br><br>mineral : cement[249]<br>powder : medium brownish grey<br>origin : CALCO, Charlesbourg, Québec<br><br>production process:<br>.25 g of chromite + 1.50 g of cement / 1525 °F / 2 h |
| medium grass-green | 1851 | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «beige [light green tone]»)<br>1.50 g of cement + .25 g of chrome / 1550 °F / 1 h<br><br>(followed at «light grass-green») |
| medium grass-green | 1852 | (followed from «grass-green [green tone more accentuated than "light grass-green"]» and «light olive-green»)<br><br>1.50 g of cement + .25 g of chrome / 1675 °F / 1 h<br><br>(followed at «light olive-green»)<br><br>(followed from «grass-green more acute than |

| | | |
|---|---|---|
| ↓ | | "intense grass-green"») |
| medium grass-green | 1853 | 1.50 g of cement + .25 g of chrome / 1850 °F / 1 h (followed at «medium olive-green») |
| | | mineral : cryolite[328]<br>rock : white, crystalline and translucid<br>powder : white<br>origin : Ivigtut, Groenland |
| | 1854 | mineral : nickel<br>powder : dark brownish grey, with metallic brilliance |
| medium grass-green | 1855 | production process:<br>3 g of cryolite + 2 g of nickel / 1700 °F / 1 h |
| | | mineral : fluorine<br>rock : colourless<br>powder : colourless<br>origin : Ohio, United States<br><br>mineral : chrome<br>powder : light grey, with metallic brilliance |
| medium cold grass-green | 1856 | production process:<br>1 g of fluorine + 1 g of chrome / 2000 °F / 20 min. |
| | | mineral : cement[269]<br>powder : medium brownish grey<br>origin : CALCO, Charlesbourg, Québec<br><br>mineral : chrome<br>powder : light grey, with metallic brilliance |
| medium and intense grass-green | 1857 | production process:<br>(followed from «light yellowish green»)<br>1.50 g of cement + .15 g of chrome / 1625 °F / 1 h (followed at «light grass-green») |
| | | mineral : orthoclase<br>rock : light pinkish beige<br>powder : very light beige<br>origin : mine near Buckingham, Papineau county, Québec |
| medium and intense grass-green | 1858 | production process:<br>(followed from «green»)<br>2 g of orthoclase + 2 g of sodium carbonate / 0↑1900 °F + 1 h at 1900 °F (bluish green) / irra- |

| | | |
|---|---|---|
| | | diated with gamma rays at 423.88 Mrad |
| | 1858.1 | mineral : bloody agate<br>rock : dark and slightly translucid grass-green<br>powder : light grey (light green tone)<br>origin : India<br><br>production process:<br>8 g of agate + 40 ml nitric acid / soaking: 1 wk. / separation of the liquid and the solid / natural drying (colour of the liquid: vivid emerald-green) / irradiated with gamma rays at: |
| grass-green lighter than «vivid grass-green»<br>↓ | 1859 | 64.7 Mrad |
| darker grass-green | 1860 | 424.7 Mrad |
| accentuated grass-green | 1861 | production process:<br>8 g of agate + 40 ml nitric acid / soaking: 1 wk. / separation of the liquid and the solid / natural drying / colour of the solid[55,330] |
| vivid and accentuated grass-green | 1862 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «cold grass-green more acute»)<br>1.50 g of cement + .50 g of chrome / grinded and moistened[331] with water until it reaches the consistency of a paste / 2000 °F / 1 h |
| intense grass-green | 1863 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «yellowish green»)<br>.50 g of calcite + 1.50 g of chrome / 1700 °F / 1 h |

300

| | | |
|---|---|---|
| intense grass-green<br>↓<br>more intense grass-green | 1864<br><br>1865 | mineral : cement[82]<br>powder : medium cold grey<br>origin : Union des Carrières, Limoilou, Québec<br><br>mineral : chrome<br>powder : light grey, with metallic brilliance<br><br><u>production process:</u><br>(followed from «light grass-green» and «light olive-green»)<br>1.50 g of cement + .50 g of chrome / 1700 °F / 1 h<br><br>1.50 g of cement + .50 g of chrome / 1800 °F / 1 h<br>(followed at «olive-green» and «medium grass-green») |
| vivid and luminous grass-green | 1866 | <u>production process:</u><br>(followed from «dark grass-green»)<br>1 g of cement + 1 g of chrome / grinded and moistened with water until it reaches the consistency of a paste / 2000 °F / 1 h |
| vivid grass-green | 1867 | mineral : mussel shell or calcium carbonate<br>shell : dark indigo-blue (violet tone)<br>powder : white<br>origin : St.-Lawrence river, Baie-des-Chaleurs, Gaspésie, Québec<br><br>mineral : chrome<br>powder : light grey, with metallic brilliance<br><br><u>production process:</u><br>(followed from «grass-green»)<br>.74 g of shell powder + 1 g of chrome / 1700 °F / 1 h |
| intense grass-green | 1868 | mineral : siderite<br>rock : caramel-brown (grey tone)<br>powder : light beige (orange tone)<br>origin : De-Mix quarry, North side of Mont Saint-Hilaire, Rouville county, Québec<br><br><u>production process:</u><br>(followed from «medium rusty orange [brown tone]»)<br>2 g of siderite + 2 g of sodium carbonate / / 0↑1600 °F + 45 min. at 1600 °F |
| | | mineral : calcite[11]<br>powder : white<br>origin : Calcite du Nord Company, Saint-Eugène |

| | | |
|---|---|---|
| grass-green a little darker and less green than «intense grass-green» | 1869 | de Mistassini, Lac Saint-Jean, Québec<br><br>mineral : chrome<br>powder : light grey, with metallic brilliance<br><br>production process:<br>1 g of calcite + 1 g of chrome + 1 g of SiC / 1700 °F / 1 h (pale grass-green [grey tone]) / cooling / 1800 °F / 15 h and 30 min. (vivid olive-green) / cooling / 1800 °F / 3 h |
| very intense grass-green | 1870 | mineral : copper<br>rock : reddish brown, with metallic luster<br>powder : reddish brown, with metallic luster<br>origin : unknown<br><br>production process:<br>rock all covered with 1000 ml acetic acid / natural drying / removal of the cristals formed at the surface of the rock (colour of the cristals: pronounced emerald-green): 2 g of cristals + 20 ml hydrochloric acid / soaking: 2 wk. / irradiated with gamma rays at 5.7 Mrad / drying on sand bath, completed on hot plate |
| powerful grass-green<br>↓ | 1871 | mineral : anorthosite<br>rock : dark grey<br>powder : medium grey<br>origin : Jonquière, Lac Saint-Jean, Québec<br><br>production process:<br>(followed from «olive-green»)<br>2 g of anorthosite + 2 g of sodium carbonate:<br>0↑1800 °F + 1 h at 1800 °F |
| powerful grass-green | 1872 | 0↑1900 °F + 1 h at 1900 °F |
| powerful grass-green<br>↓ | 1873 | mineral : tremolite<br>rock : medium brown (evergreen tone)<br>powder : greyish beige<br>origin : Tetreault Mine, Montauban, Portneuf county, Québec<br><br>production process:<br>1 g of tremolite + 1 g of sodium carbonate / 1600 °F / 1 h |
| powerful and dark grass-green | 1874 | 1 g of tremolite + 1 g of sodium carbonate / 1600 °F / 6 h<br>(followed at «grass-green») |

| | | |
|---|---|---|
| | | mineral : cerite<br>rock : dark brownish grey<br>powder : light grey (light brown tone)<br>origin : Jamestown, Boulder county, Colorado, United States<br><br>production process:<br>(followed from «brown»)<br>2 g of cerite + 2 g of sodium carbonate: |
| dark grass-green | 1875 | 0↑1500 °F + 1 h at 1500 °F |
| ↓ | | |
| more vivid and accentuated grass-green | 1876 | 0↑1600 °F + 1 h at 1600 °F |
| ↓ | | |
| grass-green still darker and more accentuated | 1877 | 0↑1700 °F + 1 h at 1700 °F<br><br>(followed at «very intense grass-green [blue tone]») |
| | | production process:<br>2 g of cerite + 2 g of potassium carbonate: |
| dark grass-green | 1878 | 0↑1500 °F |
| ↓ | | |
| grass-green more vivid and accentuated | 1879 | 0↑1600 °F |
| ↓ | | |
| grass-green still more vivid and accentuated | 1880 | 0↑1700 °F<br>(followed at «very intense grass-green [blue tone]») |
| | | mineral : cement[82]<br>powder : medium cold grey<br>origin : Union des Carrières, Limoilou, Québec<br><br>mineral : chrome<br>powder : light grey, with metallic brilliance<br><br>production process: |
| dark grass-green | 1881 | 1 g of cement + 1 g of chrome / 2000 °F / 45 min.[333]<br>(followed at «vivid and luminous grass-green») |
| | | mineral : bloody agate<br>rock : dark grass-green, slightly translucid<br>powder : light grey (light green tone)<br>origin : India<br><br>production process: |
| grass-green lighter and more | 1882 | 8 g of agate + 40 ml sulphuric acid / soaking: 1 wk. / drying on hot plate (dark grass green) / ir- |

| | | |
|---|---|---|
| vivid than «dark grass-green» | | radiated with electrons at 305,200 rad[46] |
| grass-green lighter than «dark grass-green» | 1883 | mineral : chromite[294,319]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process:<br>(followed from «dark grass-green»)<br>1.50 g of chromite + 1.50 g of calcite / 1000 °C / 1 h |
| grass-green a little lighter than «dark grass-green» | 1884 | mineral : bloody agate<br>rock : dark grass-green, slightly translucid<br>powder : light grey (light green tone)<br>origin : India<br><br>production process:<br>8 g of agate + 40 ml nitric acid / soaking: 1 wk. / separation of the liquid and the solid / natural drying (colour of the solid: accentuated grass-green) / irradiated with electrons at 305,200 rad[73] |
| dark grass-green | 1885 | production process:<br>8 g of agate + 40 ml phosphoric acid / soaking: 2 wk. / drying on hot plate (still humid) / colour of the solid[9] |
| dark grass-green | 1886 | production process:<br>8 g of agate + 40 ml sulphuric acid / soaking: 1 wk. / drying on hot plate[334] |
| | | production process:<br>rock irradiated with gamma rays at: |
| dark grass-green | 1887 | 5 Mrad |
| ↓ | 1888 | 10 Mrad |
| ↓ | 1889 | 57.4 Mrad |
| ↓ which | 1890 | 64.7 Mrad |
| intensifies | 1891 | 102.4 Mrad |
| ↓ and | 1892 | 148.4 Mrad |
| ↓ | 1893 | 201.6 Mrad |
| ↓ | 1894 | 247.6 Mrad |
| ↓ | 1895 | 287.3 Mrad |
| ↓ | 1896 | 360 Mrad[335] |
| darkens | 1897 | 424.7 Mrad |

| | | |
|---|---|---|
| dark grass-green | 1898 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «acute greenish turquoise»)<br>50 g of asbestos + 200 ml hydrochloric acid or asbestos entirely covered with hydrochloric acid / soaking: 1 wk. / drying on hot plate (vivid yellow): 4 g + 4 g of sodium carbonate / 0↑2000 °F |
| dark grass-green | 1899 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>1 g of calcite + 1 g of chrome + 1 g of SiC / 1700 °F / 1 h (pale grass-green [grey tone]) / cooling / 1800 °F / 15 h and 30 min. (vivid olive -green) / cooling / 1700 °F / 3 h |
| dark grass-green | 1900 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «grass-green [accentuated brown tone]»)<br>1.50 g of cement + .50 g of chrome / 2350 °F / 1 h (followed at «greyish brown») |
| dark grass-green | 1901 | production process:<br>(followed from «pronounced grass-green [light yellow tone]»)<br>.10 g of cement + 1.50 g of chrome / 1700 °F / 1 h (followed at «dark grass-green [yellow tone]») |
| | | mineral : chromite[294,319]<br>rock : dark grey<br>powder : dark grey<br>origin : Black Lake, Eastern Townships, Québec<br><br>mineral : calcite[11] |

| | | |
|---|---|---|
| | | powder : white<br>origin : Calcite du Nord Company, Saint-Eugène de Mistassini, Lac Saint-Jean, Québec<br><br>production process:<br>(followed from «light grass-green»)<br>1.50 g of chromite + 1.50 g of calcite / 1000 °C / 2 h[320]<br>(followed at «light grass-green», at «grass-green lighter than "dark grass-green"» and at «very dark grass-green») |
| dark grass-green | 1902 | |
| | | mineral : copper<br>rock : reddish brown, with metallic luster<br>powder : reddish brown, with metallic luster<br>origin : unknown<br><br>production process:<br>(followed from «emerald-green darker than "pronounced emerald-green"»)<br>rock all covered with 1000 ml acetic acid / natural drying / removal of the crystals formed at the surface of the rock (colour of the crystals: pronounced emerald-green): irradiated with gamma rays at 424.7 Mrad |
| dark grass-green | 1903 | |
| | | mineral : fluorine<br>rock : very light and luminous evergreen, translucid<br>origin : Poudrette quarry, Mont Saint-Hilaire, Québec<br><br>production process:<br>(followed from «smok y grey [with traces of "green"]»)<br>rock irradiated with gamma rays at: |
| dark grass-green | 1904 | 148.4 Mrad |
| ↓ | | |
| grass-green a little darker | 1905 | 247.6 Mrad |
| ↓ | | |
| grass-green still darker | 1906 | 360 Mrad<br>(followed at «blackish green [brown tone]») |
| | | mineral : granite gneiss<br>rock : reddish beige<br>powder : medium pink (light brown tone)<br>origin : Lac Beauport, region of Québec city, Québec<br><br>production process:<br>(followed from «emerald-green») |
| dark grass-green | 1907 | 2 g of gneiss + 2 g of sodium carbonate / |

| | | |
|---|---|---|
| | | 0↑1700 °F + 1 h at 1700 °F (pale emerald-green) / irradiated with gamma rays at 424.7 Mrad |
| dark grass-green | 1908 | mineral : labrador<br>rock : blackish grey<br>powder : medium grey<br>origin : Lac Saint-Jean, Québec<br><br>production process:<br>(followed from «dark green»)<br>2 g of labrador + 2 g of sodium carbonate / 0↑1900 °F + 1 h at 1900 °F (intense greenish blue) / irradiated with gamma rays at 424.7 Mrad[239] |
| dark grass-green | 1909 | mineral : spodumene<br>rock : pale green<br>powder : light grey, almost white<br>origin : Québec Lithium Co., Baraute, Abitibi, Québec<br><br>production process:<br>(followed from «peacock-blue»)<br>2 g of spodumene + 2 g of sodium carbonate / 0↑1700 °F + 1 h at 1700 °F (emerald-green more intense than "light emerald-green"») / irradiated with gamma rays at 424.7 Mrad |
| dark grass-green | 1910 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : sulphur<br>rock : brilliant yellow<br>powder : brilliant yellow<br>origin : unknown<br><br>production process:<br>1 g of wilsonite + 3 g of sodium carbonate + 1 g of sulphur / 0↑1600 °F |
| grass-green a little more accentuated than | 1911 | mineral : bloody agate<br>rock : dark grass-green, slightly translucid<br>powder : light grey (light green tone)<br>origin : India<br><br>production process:<br>rock irradiated with electrons at 164,800 rad |

| | | |
|---|---|---|
| «dark grass-green» | | |
| | | mineral : agate<br>rock : dark grass-green, slightly translucid<br>powder : light grey (light green tone)<br>origin : bank of the St.-Lawrence river, region of Maria, Gaspésie, Québec<br><br>production process:<br>rock irradiated with gamma rays[228] at: |
| grass-green more intense than «dark grass-green» \|<br>↓ | 1912 | 63.984 Mrad |
| much darker grass-green | 1913 | 242.804 Mrad<br>(followed at «blackish brown [localized green reflection]») |
| | | mineral : tremolite<br>rock : medium brown (evergreen tone)<br>powder : greyish beige<br>origin : Tetreault Mine, Montauban, Portneuf county, Québec<br><br>production process:<br>(followed from «grass-green»)<br>1 g of tremolite + 1.50 g of sodium carbonate: |
| dark grass-green | 1914 | 1600 °F / 1 h |
| of various tones, | 1915 | 1600 °F / 2 h |
| which | 1916 | 1600 °F / 3 h |
| darkens | 1917 | 1600 °F / 4 h |
| to<br>↓ | 1918 | 1600 °F / 6 h |
| very dark grass-green | 1919 | 1600 °F / 8 h |
| | | mineral : chromite[294]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process:<br>(followed from «dark grass-green») |
| very dark grass-green | 1920 | 1.50 g of chromite + 1.50 g of calcite / 1000 °C / 8 h |

| | | |
|---|---|---|
| very dark grass-green, almost black | 1921 | mineral : smaltite[25], a variety of skutterudite<br>rock : dark iron-grey, with a silver metallic brilliance<br>powder : dark grey<br>origin : Cobalt, Ontario<br><br>production process:<br>(followed from «phtalo-green[217a]»)<br>3 g of smaltite + 80 ml hydrochloric acid / soaking: 2 wk. / separation of the liquid and the solid / drying on hot plate (colour of the solid: khaki-green) / irradiated with gamma rays at 424.7 Mrad |
| blackish grass-green ↓<br>blackish grass-green | 1922<br><br>1923 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «grass-green [blue tone] darker than "grass-green [blue tone]"»)<br>1.50 g of calcite + .25 g of chrome / 2350 °F / 1 h<br><br>1.50 g of calcite + .50 g of chrome / 2350 °F / 1 h |
| blackish grass-green | 1924 | mineral : pyrophyllite<br>rock : light beige (grey and pink tones), opaque<br>powder : very light beige (grey and orange-pink tones)<br>origin : Carpentier district, Abitibi, Québec<br><br>production process:<br>(followed from «greenish blue lighter than "dark greenish blue"»)<br>2 g of pyrophyllite + 2 g of sodium carbonate / 0↑1900 °F + 1 h at 1900 °F |
| mixture of particles | | |
| | | mineral : andulusite<br>rock : light brownish grey<br>powder : light grey<br>origin : Bimbowrie, Southern Australia<br><br>production process:<br>(followed from «light apple-green») |

309

| | | |
|---|---|---|
| light grass-green / orange | 1925 | 2 g of andulusite + 2 g of sodium carbonate / 0↑1500 °F + 30 min. at 1500 °F (followed at «light grass-green») |
| | | mineral : andulusite<br>rock : light brownish grey<br>powder : light grey<br>origin : Bimbowrie, Southern Australia<br><br>mineral : sulphur<br>rock : brilliant yellow<br>powder : brilliant yellow<br>origin : unknown<br><br>production process:<br>(followed from «blackish brown») |
| dark grass-green / blackish brown | 1926 | 1 g of andulusite + 2 g of sodium carbonate + 1 g of sulphur / 0↑1600 °F (followed at «phtalo-blue») |
| grass-green (blue tone) | | |
| | | mineral : chromite[294]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process: |
| light grass-green (light blue tone) | 1927 | .50 g of chromite + 1.50 g of calcite / 1000 °C / 2 h (light grass-green) / irradiated with gamma rays at 64.7 Mrad[336] (followed at «medium grass-green [light blue tone]») |
| | | mineral : cement[269]<br>powder : medium brownish grey<br>origin : CALCO, Charlesbourg, Québec<br><br>mineral : chrome<br>powder : light grey, with metallic brilliance<br><br>production process: |
| grass-green (light blue tone) lighter than «grass-green (light blue tone)» | 1928 | 1.50 g of cement + .50 g of chrome / 1900 °F / 1 h (cold grass-green): .25 g + 20 ml hydrofluoric acid / soaking: 3 d. / drying in a drying oven at 100 °F |

| | | |
|---|---|---|
| | | mineral : chromite[294]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process:<br>(followed from «light grass-green») |
| grass-green (blue tone) | 1929 | 1.50 g of chromite + 1.50 g of calcite / 1000 °C / 1 h[337] |
| ↓ | | |
| grass-green (blue tone) | 1930 | 1 g of chromite + 1.50 g of calcite / 1000 °C / 1 h[337] |
| ↓ | | |
| grass-green (blue tone) | 1931 | .50 g of chromite + 1.50 g of calcite / 1000 °C / 1 h[337] |
| | | mineral : cement[269]<br>powder : medium brownish grey<br>origin : CALCO, Charlesbourg, Québec<br><br>mineral : chrome<br>powder : light grey, with metallic brilliance<br><br>production process: |
| cold grass-green (light blue tone) | 1932 | 1.50 g of cement + .50 g of chrome / 1900 °F / 1 h (cold grass-green): .25 g + 20 ml of a solution of tartric acid[35] / soaking: 3 d. / drying on hot plate |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process: |
| grass-green (blue tone) | 1933 | 1 g of calcite + 1 g of chrome / 2000 °F / 45 min. |
| ↓ | | |
| grass-green (blue tone) | 1934 | 1 g of calcite + 1 g of chrome / grinded and moistened with water until it reaches the consistency of a paste / 2000 °F / 45 min. |
| | | production process:<br>(followed from «grass-green more accentuated than "light grass-green"») |

| | | |
|---|---|---|
| grass-green (very light blue tone) | 1935 | 1.50 g of calcite + .50 g of chrome / 1700 °F / 1 h[339] |
| ↓ | | |
| grass-green (blue tone) more accentuated | 1936 | 1.50 g of calcite + .50 g of chrome / 1725 °F / 1 h |
| ↓ | | |
| grass-green (blue tone) still more accentuated | 1937 | 1.50 g of calcite + .50 g of chrome / 1800 °F / 1 h |
| ↓ | | |
| darker grass-green (blue tone) | 1938 | 1.50 g of calcite + .50 g de chrome / 1900 °F / 1 h |
| ↓ | | (followed at «dark grass-green [blue tone]») (followed from «dark grass-green [blue tone]») |
| grass-green (blue tone) still darker | 1939 | 1.50 g of calcite + .50 g of chrome / 2000 °F / 1 h |
| ↓ | | |
| grass-green (blue tone) still darker | 1940 | 1.50 g of calcite + .50 g of chrome / 2100 °F / 1 h |
| ↓ | | |
| grass-green (blue tone) still darker | 1941 | 1.50 g of calcite + .50 g of chrome / 2200 °F / 1 h |
| ↓ | | |
| grass-green (blue tone) still darker | 1942 | 1.50 g of calcite + .50 g of chrome / 2300 °F / 1 h |
| ↓ | | (followed at «blackish grass-green») (followed at «blackish grass-green») |
| lighter grass-green (blue tone) | 1943 | 1.50 g of calcite + .50 g of chrome / 2450 °F / 1 h |
| | | mineral : chromite[294]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec<br><br>production process:<br>(followed from «light grass-green [light blue tone]») |
| medium grass- | 1944 | .50 g of chromite + 1.50 g of calcite / 1000 °C / |

312

| | | |
|---|---|---|
| green (light blue tone) | | 2 h (light grass-green) / irradiated with gamma rays at 424.7 Mrad[239] |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «intense grass-green») |
| intense grass-green (light blue tone) | 1945 | .50 g of calcite + 1 g of chrome / 1700 °F / 1 h |
| grass-green (light blue tone) a little lighter | 1946 | .50 g of calcite + .50 g of chrome / 1700 °F / 1 h |
| grass-green (blue tone) a little lighter | 1947 | .50 g of calcite + .25 g of chrome / 1700 °F / 1 h |
| grass-green (blue tone) still a little lighter | 1948 | .50 g of calcite + .10 g of chrome / 1700 °F / 1 h |
| medium grass-green (blue tone) | 1949 | 1 g of calcite + 1.50 g of chrome / 1700 °F / 1 h |
| grass-green (blue tone) a little lighter | 1950 | 1 g of calcite + 1 g of chrome / 1700 °F / 1 h |
| grass-green (blue tone) still a little lighter | 1951 | 1 g of calcite + .50 g of chrome / 1700 °F / 1 h |
| grass-green (blue tone) still a little lighter | 1952 | 1 g of calcite + .25 g of chrome / 1700 °F / 1 h |
| grass-green (blue tone) still a little lighter | 1953 | 1 g of calcite + .10 g of chrome / 1700 °F / 1 h |
| medium grass-green (blue tone) | 1954 | 1.50 g of calcite + 1.50 g of chrome / 1700 °F / 1 h |
| grass-green (blue tone) a little | 1955 | 1.50 g of calcite + 1 g of chrome / 1700 °F / 1 h |

| | | |
|---|---|---|
| lighter<br>↓ | | |
| grass-green (blue tone) still a little lighter<br>↓ | 1956 | 1.50 g of calcite + .50 g of chrome / 1700 °F / 1 h |
| grass-green (blue tone) still a little lighter<br>↓ | 1957 | 1.50 g of calcite + .25 g of chrome / 1700 °F / 1 h |
| grass-green (blue tone) still a little lighter | 1958 | 1.50 g of calcite + .10 g of chrome / 1700 °F / 1 h |
| | | mineral : cerite<br>rock : dark brownish grey<br>powder : light grey (light brown tone)<br>origin : Jamestown, Boulder county, Colorado, United States<br><br>production process:<br>(followed from «grass-green more accentuated and vivid than "dark grass-green"») |
| very intense grass-green (blue tone)<br>↓ | 1959 | 2 g of cerite + 2 g of sodium carbonate:<br>0↑1800 °F + 1 h at 1800 °F |
| very intense grass-green (blue tone) | 1960 | 0↑1900 °F + 1 h at 1900 °F |
| very intense grass-green (blue tone) | 1961 | production process:<br>(followed from «grass-green more vivid and accentuated than "dark grass-green"»)<br>2 g of cerite + 2 g of potassium carbonate / 0↑1800 °F |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance |
| grass-green (blue tone) lighter than «dark grass-green (blue tone)» | 1962 | production process:<br>1.50 g of calcite + .50 g of chrome / 1900 °F / 1 h (grass-green [blue tone]): .25 g + 20 ml hydrofluoric acid / soaking: 24 h / drying in drying oven at 100 °F |

314

| | | |
|---|---|---|
| grass-green (blue tone) a little more pale than «dark grass-green (blue tone)» | 1962.1 | mineral : orpiment<br>rock : vivid yellow (orange tone)<br>powder : vivid yellow (orange tone)<br>origin : Nevada, United States<br><br>mineral : zirconium oxide<br>powder : light beige<br>origin : Tam Ceramic Inc., Montréal, Québec<br><br>vegetable : indigo<br>powder : very dark indigo-blue<br><br><u>production process:</u><br>0.14061 g of orpiment irradiated with gamma rays at 2.26 Mrad + 0.14061 g of indigo irradiated with gamma rays at 2.26 Mrad + 0.14061 g of zirconium oxide / grinding |
| grass-green (blue tone) a little more pale than «dark grass-green (blue tone)» | 1962.2 | mineral : orpiment<br>rock : vivid yellow (orange tone)<br>powder : vivid yellow (orange tone)<br>origin : Nevada, United States<br><br>vegetable : indigo<br>powder : very dark indigo-blue<br><br><u>production process:</u><br>0.14061 g of orpiment irradiated with gamma rays at 2.26 Mrad + 0.14061 g of indigo irradiated with gamma rays at 2.26 Mrad + 0.28122 g of sodium carbonate / grinding |
| dark grass-green (blue tone) | 1962.3 | <u>production process:</u><br>0.14061 g of orpiment irradiated with gamma rays at 2.26 Mrad + 0.14061 g of indigo irradiated with gamma rays at 2.26 Mrad / grinding |
| dark grass-green (blue tone) | 1963 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br><u>production process:</u><br>(followed from «grass-green [blue tone] darker than "dark grass-green [blue tone]"»)<br>1.50 g of calcite + .50 g of chrome:<br>2000 °F / 2:30 h |

| | | |
|---|---|---|
| ↓ | | |
| darker grass-green (blue tone) | 1964 | 2000 °F / 4 h |
| ↓ | | |
| grass-green (blue tone) still darker ↓ | 1965 | 2000 °F / 6 h |
| ↓ | | |
| grass-green (blue tone) still darker ↓ | 1966 | 2000 °F / 8 h |
| ↓ | | |
| grass-green (blue tone) still darker | 1967 | 2000 °F / 10 h |
| grass-green (blue tone) darker and more accentuated | 1968 | mineral : cryolite[340]<br>rock : white, crystalline and translucid<br>powder : white<br>origin : Ivigtut, Groenland<br><br>mineral : chrome<br>powder : light grey, with metallic brilliance<br><br><u>production process:</u><br>(followed from «grass-green lighter than "medium grass-green"»)<br>6 g of cryolite + 2 g of chrome / 1900 °F / 30 min. |
| grass-green (blue tone) more intense than «dark grass-green (blue tone)» | 1969 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br><u>production process:</u><br>1.50 g of calcite + .50 g of chrome / 1900 °F / 1 h (grass-green [blue tone]): .25 g+20 ml hydrochloric acid / soaking: 3 d. / drying on hot plate |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| | | vegetable : indigo<br>powder : very dark indigo-blue<br><br>animal : calcined bones<br>powder : black<br>origin : Anachemia Chemicals Ltd., Montréal, Québec<br><br>production process: |
| grass-green (blue tone) a little more pale than «very dark grass-green, almost black (very accentuated blue tone)» | 1969.1 | 0↑1900 °F (chamois [orange tone a little more accentuated than «light orange tone»]): .50 g + 200 ml hydrochloric acid or asbestos entirely covered with hydrochloric acid / soaking: 1 wk. / drying on hot plate (vivid sunny yellow [light green tone]): 1 g + 0.28122 g of indigo + 0.14061 g of calcined animal bones + 0.14061 g of MgO / grinding |
| grass-green (blue tone) a little more pale than «very dark grass-green, almost black (very accentuated blue tone)» | 1969.2 | production process:<br>0↑1900 °F (chamois [orange tone a little more accentuated than «light orange tone»]): .50 g + 200 ml hydrochloric acid or asbestos entirely covered with hydrochloric acid / soaking: 1 wk. / drying on hot plate (vivid sunny yellow [light green tone]): 1 g + 0.28122 g of indigo + 0.14061 g calcined animal bones + 0.28122 g of potassium carbonate / grinding |
| very dark grass-green, almost black (very accentuated blue tone) | 1969.3 | production process:<br>0↑1900 °F (chamois [orange tone a little more accentuated than «light orange tone»]): .50 g + 200 ml hydrochloric acid or asbestos entirely covered with hydrochloric acid / soaking: 1 wk. / drying on hot plate (vivid sunny yellow [light green tone]): 1 g + 0.28122 g of indigo + 0.14061 g calcined animal bones / grinding |
| grass-green (yellow tone) | | |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «light yellow [light green tone]») |
| light grass-green (light yellow tone) | 1970 | 1.50 g of calcite + .50 g of chrome / 1500 °F / 1 h<br>(followed at «light grass-green» and «very light green») |

| | | |
|---|---|---|
| | | mineral : cement[269]<br>powder : medium brownish grey<br>origin : CALCO, Charlesbourg, Québec<br><br>mineral : chrome<br>powder : light grey, with metallic brilliance<br><br><u>production process:</u><br>(followed from «light grass-green») |
| grass-green (light yellow tone) | 1971 | 1.50 g of cement + .25 g of chrome / 1675 °F / 1 h |
| pronounced grass-green (light yellow tone) | 1972 | 1.50 g of cement + .50 g of chrome / 1700 °F / 1 h |
| pronounced grass-green (diminished yellow tone) | 1973 | 1.50 g of cement + .50 g of chrome / 1800 °F / 1 h<br><br>(followed at «cold grass-green») |
| | | <u>production process:</u><br>(followed from «dark grass-green») |
| dark grass-green (yellow tone) | 1974 | .10 g of cement + 1 g of chrome / 1700 °F / 1 h |
| dark grass-green (accentuated yellow tone) | 1975 | .10 g of cement + .50 g of chrome / 1700 °F / 1 h |
| dark grass-green (yellow tone still more accentuated) | 1976 | .10 g of cement + .25 g of chrome / 1700 °F / 1 h |
| dark grass-green (yellow tone still more accentuated) | 1977 | .10 g of cement + .10 g of chrome / 1700 °F / 1 h<br><br>(followed at «dark green [yellow tone]»)<br><br>(followed from «pronounced yellowish green») |
| pronounced grass-green (yellow tone) | 1978 | 1 g of cement + 1 g of chrome / 1700 °F / 1 h |
| lighter grass-green (lightened yellow tone) | 1979 | 1 g of cement + .50 g of chrome / 1700 °F / 1 h |
| lighter grass-green (yellow tone more lightened) | 1980 | 1 g of cement + .25 g of chrome / 1700 °F / 1 h |

| | | |
|---|---|---|
| lighter grass-green (lighter yellow tone) | 1981 | 1 g of cement + .10 g of chrome / 1700 °F / 1 h |
| ↓ dark grass-green (yellow tone) | 1982 | 1.50 g of cement + 1.50 g of chrome / 1700 °F / 1 h |
| ↓ lighter grass-green (lighter yellow tone) | 1983 | 1.50 g of cement + 1 g of chrome / 1700 °F / 1 h |
| ↓ still lighter grass-green (still lighter yellow tone) | 1984 | 1.50 g of cement + .50 g of chrome / 1700 °F / 1 h |
| ↓ lighter grass-green (still lighter yellow tone) | 1985 | 1.50 g of cement + .25 g of chrome / 1700 °F / 1 h |
| ↓ lighter grass-green (still lighter yellow tone) | 1986 | 1.50 g of cement + .10 g of chrome / 1700 °F / 1 h |
| | | mineral : asbestos[4]<br>rock : dark grey (green reflection)<br>powder : light grey (green reflection)<br>origin : Asbestos Corporation Ltd., Thetford-Mines, Québec<br><br>vegetable : indigo<br>powder : very dark indigo blue |
| grass-green (yellow tone) a little more pale than «very intense grass-green (yellow tone)» | 1986.1 | production process:<br>0↑1900 °F (chamois [orange tone a little more accentuated than «light orange tone»]): .50 g + 200 ml hydrochloric acid or asbestos entirely covered with hydrochloric acid / soaking: 1 wk. / drying on hot plate (vivid sunny yellow [light green tone]): 1 g + 0.14061 g of indigo + 0.14061 g of MgO / grinding |
| grass-green (yellow tone) a little more pale than «very intense grass-green (yellow tone)» | 1986.2 | production process:<br>0↑1900 °F (chamois [orange tone a little more accentuated than «light orange tone»]): .50 g + 200 ml hydrochloric acid or asbestos entirely covered with hydrochloric acid / soaking: 1 wk. / drying on hot plate (vivid sunny yellow [light green tone]): 1 g + 0.14061 g of indigo + 0.28122 g of potassium carbonate / grinding |

| | | |
|---|---|---|
| very intense grass-green (yellow tone) | 1986.3 | production process:<br>0↑1900 °F (chamois [orange tone a little more accentuated than «light orange tone»]): .50 g + 200 ml hydrochloric acid or asbestos entirely covered with hydrochloric acid / soaking: 1 wk. / drying on hot plate (vivid sunny yellow [light green tone]): 1 g + 0.14061 g of indigo / grinding |
| | | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «grass-green lighter and colder than "grass-green"») |
| dark grass-green (yellow tone) | 1987 | 1.50 g of cement + 1.50 g of chrome / 1700 °F / 1 h |
| ↓ lighter grass-green (lighter yellow tone) | 1988 | 1.50 g of cement + 1 g of chrome / 1700 °F / 1 h |
| ↓ still lighter and colder grass-green | 1989 | 1.50 g of cement + .50 g of chrome / 1700 °F / 1 h |
| ↓ lighter and colder grass-green | 1990 | 1.50 g of cement + .25 g of chrome / 1700 °F / 1 h |
| ↓ still lighter and colder grass-green | 1991 | 1.50 g of cement + .10 g of chrome / 1700 °F / 1 h[341] |
| grass-green (beige tone) | | |
| | | mineral : hornblende<br>rock : medium evergreen (light grey tone), with a vitreous brilliance<br>powder : medium cold grey (light green tone)<br>origin : Abitibi, Québec<br><br>production process:<br>(followed from «greyish green much more accentuated than "light greyish green"») |
| light grass-green (light beige tone) | 1992 | 3 g of hornblende + 25 ml sulphuric acid / soaking: 24 h / drying on hot plate (light greyish green) / irradiated with gamma rays at 424.7 Mrad[342] |

320

| grass-green (brown tone) | | |
|---|---|---|
| grass-green (light brown tone) | 1993 | mineral : hypersthene<br>rock : black<br>powder : medium brownish grey<br>origin : Lac Saint-Jean, Québec<br><br>production process:<br>(followed from «grass-green»)<br>2 g of hypersthene + 2 g of sodium carbonate / 0↑1900 °F + 1 h at 1900 °F |
| grass-green (light brown tone) | 1994 | mineral : chromite[294]<br>rock : dark grey<br>powder : dark grey<br>origin : Black Lake, Eastern Townships, Québec<br><br>mineral : fluorescent calcite<br>rock : white (localized grey or brown reflection), translucid<br>powder : white (yellow reflection)<br>origin : Bancroft, Ontario<br><br>production process:<br>(followed from «light khaki-brown [or light brown with a light green tone]»)<br>1.50 g of calcite + .50 g of chromite / 1000 °C / 2 h<br>(followed at «dark khaki-brown [or greenish brown]» and «brown [pronounced green tone]») |
| grass-green (light brown tone) | 1995 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «cold and acute grass-green»)<br>1.50 g of cement + .25 g of chrome / 2050 °F / 1 h |
| grass-green (brown tone slightly more accentuated) | 1996 | 1.50 g of cement + .25 g of chrome / 2100 °F / 1 h |
| grass-green (brown tone still slightly more accentuated) | 1997 | 1.50 g of cement + .25 g of chrome / 2200 °F / 1 h |

321

| | | |
|---|---|---|
| ↓<br>grass-green (brown tone still slightly more accentuated) | 1998 | 1.50 g of cement + .25 g of chrome / 2250 °F / 1 h<br><br>(followed at «greyish brown») |
| medium grass-green (light brown tone) | 1999 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «light grass-green»)<br>1 g of calcite + 1 g of chrome + 1 g of MgO / 1800 °F / 15 h |
| grass-green (light brown tone) more pronounced than «medium grass-green (brown tone)» | 2000 | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br>production process:<br>(followed from «medium mossy grass-green»)<br>1.50 g of cement + 1 g of chromite / 1000 °C / 2 h[343] |
| ↓<br>grass-green (light brown tone) still more pronounced | 2001 | 1.50 g of cement + 1.50 g of chromite / 1000 °C / 2 h |
| dark grass-green (brown tone) | 2002 | mineral : bloody agate<br>rock : dark grass-green, slightly translucid<br>powder : light grey (light green tone)<br>origin : India<br><br>production process:<br>8 g of agate + 40 ml sulphuric acid / soaking: 1 wk. / drying on hot plate (dark grass-green) / |

| | | |
|---|---|---|
| | | irradiated with gamma rays at 63.88 Mrad<br>(followed at «dark brownish green») |
| grass-green more intense than «intense grass-green»<br>which evolves towards<br>↓<br>dark grass-green (brown tone) | 2003<br>2004<br>2005<br>2006<br>2007<br>2008<br>2009<br>2010 | mineral : beryl<br>rock : intense grass-green, slightly translucid<br>powder : greenish grey<br>origin : unknown<br><br>production process:<br>rock irradiated with gamma rays[228] at:<br>70.4 Mrad[344]<br>102.4 Mrad<br>148.4 Mrad<br>201.6 Mrad<br>247.6 Mrad<br>287.3 Mrad<br>360 Mrad<br>430.4 Mrad |
| dark grass-green (brown tone) | 2011 | mineral : siderite<br>rock : caramel-brown (grey tone)<br>powder : light beige (orange tone)<br>origin : De-Mix quarry, North side of Mont Saint-Hilaire, Rouville county, Québec<br><br>production process:<br>(followed from «blue»)<br>2 g of siderite + 2 g of sodium carbonate / 0↑1600 °F + 1 h at 1600 °F (light greenish blue) / irradiated with gamma rays at 424.7 Mrad |
| grass-green (brown tone) a little darker than «dark grass-green (brown tone)» | 2012 | mineral : bloody agate<br>rock : dark grass-green, slightly translucid<br>powder : light grey (light green tone)<br>origin : India<br><br>production process:<br>8 g of agate + 40 ml nitric acid / soaking: 1 wk. / separation of the liquid and the solid / natural drying (colour of the solid: accentuated grass-green) / irradiated with gamma rays at 64.7 Mrad<br><br>(followed at «dark brownish green») |

| grass-green (grey tone) | | |
|---|---|---|
| very pale grass-green (grey tone) | 2013 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>1 g of calcite + 1 g of chrome + 1 g of $Ca(OH)^2$ / 1700 °F / 1 h<br>(followed at «dark grass-green [accentuated grey tone]») |
| pale grass-green (grey tone) | 2014 | production process:<br>(followed from «dark grey»)<br>1 g of calcite + 1 g of chrome + 1 g of SiC / 1700 °F / 1 h<br>(followed at «dark greenish grey», «vivid olive-green», «dark grass-green» and «grass-green a little darker and less green than "vivid grass-green"») |
| light grass-green (grey tone) | 2015 | mineral : anorthosite<br>rock : dark grey<br>powder : medium grey<br>origin : Jonquière, Lac Saint-Jean, Québec<br><br>production process:<br>(followed from «apple-green [light orange tone]»)<br>2 g of anorthosite + 2 g of sodium carbonate / 0↑1600 °F + 1 h at 1600 °F (intense mint-green) / irradiated with gamma rays at 550.22 Mrad |
| grass-green (grey tone), cold and mat | 2016 | mineral : fuel oil soot[86]<br>powder : profound brownish black<br>origin : boiler room of Laval University, city of Québec, Québec<br><br>production process:<br>2 g of soot + 20 ml sulphuric acid / soaking: 24 h / deposited on a hot plate / a bubbling reaction starts immediately[345] / immediately after the bubbling, separation of the liquid and the solid / drying on hot plate / colour of the liquid[77] |
| | | mineral : agate<br>rock : dark grass-green, slightly translucid<br>powder : light grey (light green tone) |

| | | |
|---|---|---|
| grass-green (grey tone) much more pale and cold than «dark grass-green (grey tone)» | 2017 | origin : bank of St.-Lawrence river, region of Maria, Gaspésie, Québec<br><br>production process:<br>powder irradiated with electrons at 302,831 rad[36] |
| dark grass-green (accentuated grey tone) | 2018 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «very pale grass-green [grey tone]»)<br>1 g of calcite + 1 g of chrome + 1 g of $Ca(OH)^2$ / 1700 °F / 1 h / cooling (very pale grass-green [grey tone]) / 1800 °F / 15 h |
| dark grass-green (grey tone) | 2019 | mineral : uraninite<br>rock : medium chocolate-brown (red Bordeau tone)<br>powder : medium milky chocolate-brown<br>origin : Yellowknife, Canada<br><br>production process:<br>8 g of uraninite + 100 ml phosphoric acid / soaking: 4 yr. / formation of 4 superposed layers of colours, of which the first two layers at the surface are in a liquid state and the last two layers in the bottom are in a solid state / drying on hot plate (still humid) / colour of the last layer in a solid state at the bottom[346,347] |
| grass-green (grey tone) a little more accentuated | 2020 | mineral : agate<br>rock : dark grass-green, slightly translucid<br>powder : light grey (light green tone)<br>origin : bank of St.-Lawrence river, region of Maria, Gaspésie, Québec<br><br>production process:<br>powder irradiated with gamma rays at:<br>65.704 Mrad |

325

| | | |
|---|---|---|
| than «dark grass-green (grey tone)»<br>↓<br>grass-green (grey tone) much darker | 2021 | 244.53 Mrad<br>(followed at «medium brownish green») |
| green [between «grass-green» and «Paris green»] | | |
| intense green [between «grass-green» and «Paris green»] | 2022 | mineral : chalcocite<br>rock : dark iron-grey (with localized turquoise oxidation)<br>powder : dark iron-grey<br>origin : Butte, Montana, United States<br><br><u>production process:</u><br>4 g of chalcocite + 100 ml hydrochloric acid / soaking: 2 wk. / separation of the liquid and the solid / drying on hot plate / colour of the liquid[348]<br>(followed at «yellowish green») |
| intense green [between «grass-green» and «Paris green»] | 2023 | <u>production process:</u><br>4 g of chalcocite + 100 ml nitric acid / soaking: 2 wk. / separation of the liquid (1st) and the solid / desiccation of the 1st liquid (colour of the 1st liquid: very intense emerald-green) / addition to the same solid of 100 ml nitric acid / soaking: 2 wk. / separation of the liquid (2nd) and the solid / desiccation of the 2nd liquid (colour of the 2nd liquid: mixture of particles: very vivid blue / acute greenish turquoise) / natural drying of the solid / colour of the solid |
| mossy grass-green | | |
| mossy grass-green a little more pale than «medium mossy grass-green» | 2024 | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br><u>production process:</u><br>1.50 g of cement + .50 g of chromite / 1000 °C / 2 h (medium mossy grass-green) / irradiated with gamma rays at:<br>64.7 Mrad |

| | | |
|---|---|---|
| ↓ mossy grass-green still a little more pale (accentuated grey tone) | 2025 | 424.7 Mrad |
| medium mossy grass-green | 2026 | production process: (followed from «light grey [light green tone]») 1.50 g of cement + .50 g of chromite / 1000 °C / 2 h |
| green [between «grass-green» and «mint-green»] | | |
| light green [between «grass-green» and «mint-green»] | 2026.1 | mineral : goethite[106]<br>powder : rusty orange<br>origin : Red Mill, in the suburbs of Cap-de-la-Madeleine, Québec<br><br>production process: 1% of goethite is mixed with molten glass (crystal) and the entity is amalgamated at 2,400 °F |
| green [between «grass-green» and «mint-green»], slightly darker than «light green [between «grass-green» and «mint-green»] | 2026.1a | production process: 1% of goethite is mixed with molten glass (crystal) and the entity is amalgamated at 2,400 °F (light green [between «grass-green» and «mint-green»]) / irradiated with gamma rays at:<br>2.47 Mrad |
| ↓ still darker | 2026.1b | 4.94 Mrad |
| ↓ very slightly darker | 2026.1c | 7.41 Mrad |
| ↓ still a little darker | 2026.1d | 9.88 Mrad |
| | | mineral : iron sulphide - nickel<br>rock : medium greyish green<br>powder : light grey (light green tone)<br>origin : small copper and nickel deposit, in the South-Western area of a mass of serpentinite at 3 km at the West of Saint-Fabien-de-Panet, Québec |

| | | |
|---|---|---|
| medium green [between «grass-green» and «mint-green»] | 2026.2 | production process:<br>1% of iron sulphide / nickel is mixed with molten glass (crystal) and the entity is amalgamated at 2,400 °F |
| green [between «grass-green» and «mint-green»], a little darker than «medium green [between «grass-green» and «mint-green»] | 2026.2a | production process:<br>1% of iron sulphide / nickel is mixed with molten glass (crystal) and the entity is amalgamated at 2,400 °F (medium green [between «grass-green» and «mint-green»]) / irradiated with gamma rays at 2.47 Mrad<br>(followed at «dark caramel-brown [grey tone and green reflection]») |
| emerald-green | | |
| | | mineral : granite gneiss<br>rock : reddish beige<br>powder : medium pink (light brown tone)<br>origin : Lac Beauport, region of the city of Québec, Québec<br><br>production process:<br>(followed from «green [with a few yellow particles]»)<br>2 g of gneiss + 2 g of sodium carbonate: |
| pale emerald-green ↓ | 2027 | 0↑1700 °F + 1 h at 1700 °F |
| more accentuated emerald-green | 2028 | 0↑1800 °F + 1 h at 1800 °F<br>(followed at «mixture of particles: green / grey / brown») |
| emerald-green much more intense than «pale emerald-green» | 2029 | production process:<br>2 g of gneiss + 2 g of sodium carbonate / 0↑1700 °F + 1 h at 1700 °F (pale emerald-green) / irradiated with gamma rays at 64.7 Mrad<br>(followed at «dark grass-green») |
| emerald-green a little lighter than «light emerald-green» | 2030 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 20 ml hydrochloric acid + 5 ml nitric acid / soaking: 6 d. / separation of the liquid and the solid / natural drying (colour of the liquid: light emerald-green[24]) / irradiated with gamma rays at 65.65 Mrad<br>(followed at «medium greenish beige») |

| | | |
|---|---|---|
| | | mineral : copper<br>rock : reddish brown, with metallic luster<br>powder : reddish brown, with metallic luster<br>origin : unknown |
| pale emerald-green | 2030.1 | production process:<br>100 g of copper + 100 ml hydrochloric acid / soaking: 5 mo. / natural drying (mint-green [malachite-green type]) / 0↑450 °F (mint-green slightly darker than at 0↑400 °F): .50 g + 5 ml ammonia / natural drying (greenish turquoise still a little more green): .1 g + 50 cc of transparent polyester resin + 1% of catalyst / manual grinding / deposited in a container which is hermetically closed with a cover and deposited in an oven for plastics at 100 °F until it is hardened |
| | | mineral : analcime<br>rock : white (grey reflection), crystalline and translucid<br>powder : light grey<br>origin : De-Mix quarry, North side of Mont Saint-Hilaire, Rouville county, Québec |
| light emerald-green | 2031 | production process:<br>powder irradiated with neutrons during 2,000 seconds at $10^{12}$ neutrons / $cm^2$ / sec (light greyish beige, quite vivid) / entirely covered with 20 ml of the D19 Kodak photographic developer / colour of the liquid[330a] |
| | | mineral : bornite<br>rock : reddish brown (with localized green and bluish green oxidation)<br>powder : reddish brown<br>origin : Lac Musset, Fosse du Labrador, Québec |
| light emerald-green | 2032 | production process:<br>(followed from «light greenish turquoise»)<br>2 g of bornite + 20 ml hydrochloric acid + 5 ml nitric acid / soaking: 6 d. / separation of the liquid and the solid / natural drying / colour of the liquid[24]<br>(followed at «very light yellowish green» and «vivid phtalo-green») |
| | | mineral : copper<br>rock : reddish brown, with metallic luster<br>powder : reddish brown, with metallic luster<br>origin : unknown |

| | | |
|---|---|---|
| light emerald-green | 2033 | <u>production process:</u><br>rock entirely covered with 1000 ml acetic acid / natural drying / removal of the crystals formed at the surface of the rock (the colour of the crystals: pronounced emerald-green): 2 g + 20 ml phosphoric acid / soaking: 3 d. / drying on hot plate (still humid) / colour of the liquid[7]<br>(followed at «dark grey») |
| | | mineral : spodumene<br>rock : pale green<br>powder : light grey, almost white<br>origin : Québec Lithium Co., Baraute, Abitibi, Québec<br><br><u>production process:</u><br>(followed from «mixture of particles: olive-green / brown»)<br>2 g of spodumene + 2 g of sodium carbonate: |
| light emerald-green | 2034 | 0↑1600 °F + 1 h at 1600 °F<br><br>(followed from «profound and intense blue») |
| more intense emerald-green | 2035 | 0↑1700 °F + 1 h at 1700 °F |
| emerald-green still more intense | 2036 | 0↑1800 °F + 1 h at 1800 °F |
| ↓ emerald-green still more intense | 2037 | 0↑1900 °F + 1 h at 1900 °F |
| | | mineral : agate<br>rock : dark grass-green, slightly translucid<br>powder : light grey (light green tone)<br>origin : bank of St.-Lawrence river, region of Maria, Gaspésie, Québec<br><br><u>production process:</u><br>(followed from «grey»)<br>2 g of agate + 2 g of sodium carbonate: |
| emerald-green | 2038 | 0↑1800 °F + 1 h at 1800 °F |
| ↓ emerald-green | 2039 | 0↑1900 °F + 1 h at 1900 °F |
| | | mineral : bornite<br>rock : reddish brown (with localized green and bluish green oxidation)<br>powder : reddish brown<br>origin : Lac Musset, Fosse du Labrador, Québec |

| | | |
|---|---|---|
| emerald-green | 2040 | production process:<br>(followed from «intense and dark phtalo-green»)<br>3 g of bornite + 50 ml nitric acid / soaking: 6 d. / separation of the liquid and the solid / natural drying / colour of the liquid[407]<br>(followed at «pale apple-green») |
| emerald-green | 2041 | mineral : fluorescent calcite<br>rock : white (localized grey or brown reflection), translucid<br>powder : white (yellow reflection)<br>origin : Bancroft, Ontario<br><br>production process:<br>2 g of calcite + 2.50 g of sodium carbonate / 1700 °F / 1 h |
| | 2042 | mineral : jade<br>rock : dark red (orange tone)<br>powder : reddish orange<br>origin : China<br><br>production process:<br>(followed from «brown»)<br>2 g of jade + 2 g of sodium carbonate: |
| emerald-green | 2043 | 0↑1600 °F + 1 h at 1600 °F |
| emerald-green | 2044 | 0↑1700 °F + 1 h at 1700 °F |
| emerald-green | 2045 | 0↑1800 °F + 1 h at 1800 °F |
| ↓ emerald-green | 2046 | 0↑1900 °F + 1 h at 1900 °F |
| | 2047 | mineral : cobalt sulphide[597]<br>rock : dark grey, with metallic brilliance<br>powder : dark grey<br>origin : Cobalt, Ontario |
| emerald-green | 2047.1 | production process:<br>4 g of cobalt sulphide + 20 ml hydrochloric acid / soaking: 24 h / separation of the liquid and the solid / drying on hot plate / colour of the liquid[77] |
| emerald-green | 2048 | mineral : nickel sulphide<br>rock : dark grey<br>powder : dark grey<br>origin : Sudbury, Ontario<br><br>production process:<br>4 g of nickel sulphide + 20 ml phosphoric acid |

331

| | | |
|---|---|---|
| | | / soaking: 3 d. / drying on hot plate[24] |
| emerald-green<br>more intense than «emerald-green» | 2048.1 | mineral : copper<br>rock : reddish brown, with metallic luster<br>powder : reddish brown, with metallic luster<br>origin : unknown<br><br>production process:<br>100 g of copper + 100 ml hydrochloric acid / soaking: 5 mo. / drying on hot plate (greenish turquoise fairly pronounced): .50 g + 5 ml ammonia / natural drying (blue [light turquoise tone]): .1 g + 50 cc of transparent polyester resin + 1% of catalyst / manual grinding / deposited in a container which is hermetically closed with a cover and deposited in anoven for plastics at 100 °F until it is hardened |
| emerald-green<br>↓<br>darker and more intense emerald-green | 2049<br><br>2050 | mineral : obsidian<br>rock : very dark smok y grey, almost black<br>powder : light grey<br>origin : Arkansas, United States<br><br>production process:<br>2 g of obsidian + 2 g of sodium carbonate / 0↑1800 °F + 1 h at 1800 °F (grass-green) / irradiated with gamma rays at:<br>63.88 Mrad<br><br>423.88 Mrad[239] |
| emerald-green a little more blue than «emerald-green» | 2051 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml nitric acid / soaking: 2 wk. / separation of the liquid (1st) and the solid / desiccation of the 1st liquid (colour of the 1st liquid: very intense emerald-green) / addition of 100 ml nitric acid to the same solid / separation of the liquid (2nd) and the solid / desiccation of the 2 nd liquid (colour of the 2nd liquid: mixture of particles: very vivid blue / acute greenish turquoise) / natural drying of the |

| | | |
|---|---|---|
| | | solid (colour of the solid: intense green [between «grass-green» and «Paris green »]) / the 1st liquid is irradiated with electrons at 162,431 rad |
| emerald-green a little more intense than «emerald-green» | 2052 | mineral : agate<br>rock : dark grass-green, slightly translucid<br>powder : light grey (light green tone)<br>origin : bank of St.-Lawrence river, region of Maria, Gaspésie, Québec<br><br>production process:<br>2 g of agate + 2 g of sodium carbonate / 0↑1900 °F + 1 h at 1900 °F (emerald-green) / irradiated with electrons at 162,431 rad |
| emerald-green more intense than «emerald-green» | 2053 | mineral : chalcocite<br>rock : dark iron-grey (with localized turquoise oxidation)<br>powder : dark iron-grey<br>origin : Butte, Montana, United States<br><br>production process:<br>0↑1900 °F (dark iron-grey): 1 g + 80 ml nitric acid / soaking: 2 wk. / separation of the liquid and the solid / natural drying (colour of the liquid: greenish blue[24]) / irradiated with electrons at 162,431 rad |
| emerald-green much more accentuated [green] and darker than «emerald-green» | 2054 | mineral : jade<br>rock : dark red (orange tone)<br>powder : reddish orange<br>origin : China<br><br>production process:<br>2 g of jade + 2 g of sodium carbonate / 0↑1700 °F + 1 h at 1700 °F (emerald-green) / irradiated with gamma rays at 424.7 Mrad[81,239] |
| emerald-green more pale than | 2055 | mineral : sardonyx<br>rock : white, slightly translucid (with a light orange-amber circular area on the surface)<br>powder : very light grey<br>origin : unknown<br><br>production process:<br>4 g of sardonyx + 40 ml nitric acid / soaking: 1 wk. / separation of the liquid and the solid / |

333

| | | |
|---|---|---|
| «medium emerald-green» | | natural drying (colour of the liquid: medium emerald-green[24]) / irradiated with gamma rays at 64.7 Mrad<br>(followed at «mixture of particles: honey-yellow [orange tone] / medium chocolate-brown») |
| medium emerald-green | 2056 | production process:<br>4 g of sardonyx + 40 ml nitric acid / soaking: 1 wk. / separation of the liquid and the solid / natural drying / colour of the liquid[160] |
| medium and intense emerald-green | 2057 | mineral : uraninite<br>rock : medium chocolate-brown (red Bordeau tone)<br>powder : medium milky chocolate-brown<br>origin : Yellowknife, Canada<br><br>production process:<br>8 g of uraninite + 100 ml phosphoric acid / soaking: 4 yr. / formation of 4 superposed layers of colours, of which the two at the surface are in a liquid state and the two at the bottom are in a solid state / drying on hot plate (still humid) / colour of the 1st layer of solid[352a] |
| vivid emerald-green | 2058 | mineral : bloody agate<br>rock : dark grass-green, slightly translucid<br>powder : light grey (light green tone)<br>origin : India<br><br>production process:<br>8 g of agate + 40 ml nitric acid / soaking: 1 wk. / separation of the liquid and the solid / natural drying / colour of the liquid[353a] |
| intense emerald-green | 2059 | mineral : bornite<br>rock : reddish brown (with localized green and bluish green oxidation)<br>powder : reddish brown<br>origin : Lac Musset, Fosse du Labrador, Québec<br><br>production process:<br>(followed from «light and acute phtalo-green»)<br>3 g of bornite + 50 ml hydrochloric acid / soaking: 6 d. / natural drying / colour of the liquid[24]<br>(followed at «very, very vivid apple-green» and «very vivid canary-yellow») |
| | | mineral : fluorescent calcite<br>rock : white (localized grey or brown reflection), translucid<br>powder : white (yellow reflection) |

334

| | | |
|---|---|---|
| intense emerald-green | 2060 | origin : Bancroft, Ontario<br><br>production process:<br>2 g of calcite + 1 g of sodium carbonate / 1700 °F / 1 h |
| intense emerald-green | 2061 | mineral : copper concentrate (Cu-FeS)<br>powder : medium chocolate-brown (grey tone)<br>origin : Centre de recherche des Mines Noranda in Montréal, Québec<br><br>production process:<br>4 g of concentrate + 50 ml nitric acid / soaking: 2 h / separation of the liquid and the solid in 6 parts;a) pure liquid: natural drying; b) pure liquid: drying on sand bath; c) liquid + a small quantity of solid: natural drying; d) solid: natural drying; e) solid: drying on sand bath; f) solid derived from c): natural drying / colour of a) pure liquid dried naturally[24,355a] |
| intense emerald-green | 2062 | mineral : graphite<br>rock : dark grey, with metallic brilliance<br>powder : dark grey, with metallic brilliance<br>origin : Grenville, Québec<br><br>production process:<br>1 g of graphite + 1 g of sodium carbonate / 1800 °F / 1 h[356a] |
| intense emerald-green<br>↓ | 2063 | production process:<br>(followed from «metallic grey»)<br>1 g of graphite + 2 g of potassium carbonate:<br>0↑1600 °F |
| darker emerald-green | 2064 | 0↑1700 °F<br>(followed at «emerald-green [blue tone]») |
| pronounced emerald-green | 2065 | mineral : copper<br>rock : reddish brown, with metallic luster<br>powder : reddish brown, with metallic luster<br>origin : unknown<br><br>production process:<br>rock entirely covered with 1000 ml acetic acid / natural drying / removal of the crystals formed at the surface of the rock / the colour of the crystals |

335

| | | |
|---|---|---|
| emerald-green darker than «pronounced emerald-green» | 2066 | production process : rock entirely covered with 1000 ml acetic acid / natural drying / removal of the crystals formed at the surface of the rock (colour of the crystals: pronounced emerald-green) / irradiated with gamma rays at 64.7 Mrad (followed at «dark grass-green») |
| | | production process: rock entirely covered with 1000 ml acetic acid / natural drying / removal of the crystals formed at the surface of the rock (colour of the crystals: pronounced emerald-green): 1 g + 4 ml ammonia / natural drying (very intense blue [violet tone]): .2 g + 50 cc of transparent polyester resin + 1% of catalyst / manual grinding / moulding / hardening (vivid emerald-green) / irradiated with electrons at: |
| emerald-green much more accentuated than «vivid emerald-green» ↓ | 2067 | 155,082 rad |
| emerald-green a little more intense | 2068 | 305,082 rad[73] |
| emerald-green lighter than «very vivid emerald-green» | 2069 | production process: rock entirely covered with 1000 ml acetic acid / natural drying / removal of crystals formed at the surface of the rock (colour of the crystals: very pronounced emerald-green) / irradiated with electrons at 302,831 rad[35] |
| | | mineral : chalcocite<br>rock : dark iron-grey (with localized turquoise oxidation)<br>powder : dark iron-grey<br>origin : Butte, Montana, United States |
| very intense emerald-green | 2070 | production process: 4 g of chalcocite + 100 ml nitric acid / soaking: 2 wk. / separation of the liquid (1st) and the solid / addition of 100 ml nitric acid to the same solid / separation of the liquid (2nd) and the solid / desiccation of the 2nd liquid (mixture of particles: very vivid blue / acute greenish turquoise) / natural drying of the solid (colour of the solid: intense green [between «grass-green» and «Paris green»]) / desiccation of the 1st liquid / colour of the 1st liquid[357a] |

| | | |
|---|---|---|
| | | mineral : smaltite[25], a variety of skutterudite<br>rock : dark iron-grey, with silver metallic brilliance<br>powder : dark grey<br>origin : Cobalt, Ontario |
| very vivid emerald-green | 2071 | production process:<br>3 g of smaltite + 80 ml hydrochloric acid / soaking: 2 wk. / separation of the liquid and the solid / drying on hot plate (colour of the liquid: very vivid green) / irradiated with electrons at 162,431 rad |
| emerald-green much more intense than «very vivid emerald-green» | 2072 | production process:<br>3 g of smaltite + 80 ml hydrochloric acid / soaking: 2 wk. / separation of the liquid and the solid / drying on hot plate (colour of the liquid: very vivid green) / irradiated with gamma rays at 64.7 Mrad<br>(followed at «mixture of particles: grass-green / lilac») |
| | | mineral : copper<br>rock : reddish brown, with metallic luster<br>powder : reddish brown, with metallic luster<br>origin : unknown<br><br>mineral : cement[1138]<br>powder : white |
| emerald-green more green, less blue and much more vivid and intense than «very intense emerald-green» | 2073 | production process:<br>rock entirely covered with 1000 ml acetic acid / natural drying / removal of the crystals formed at the surface of the rock (colour of the crystals: pronounced emerald-green): 2 g + 4 g of cement + 6 cc of polymer used for concrete + 0.18 cc of catalyst + 1.50 thousandth of a g of cobalt 6% / manual grinding / moulding / hardening / irradiated with gamma rays at 18.85 Mrad |
| | | mineral : chromite<br>rock : blackish grey<br>powder : medium brownish grey<br>origin : Black Lake, near Thetford-Mines, Québec |
| powerful emerald-green | 2074 | production process:<br>4 g of chromite + 50 ml phosphoric acid / soaking: 2 wk. / drying on hot plate (still humid) |
| | | mineral : galena<br>rock : dark grey, with metallic brilliance |

337

| | | |
|---|---|---|
| | | powder : dark grey, with metallic brilliance<br>origin : Trail, British Columbia, Canada<br><br>mineral : sulphur<br>rock : brilliant yellow<br>powder : brilliant yellow<br>origin : unknown<br><br><u>production process:</u> |
| dark and powerful emerald-green | 2075 | 10 g of galena + 20 g of sodium carbonate + 10 g of sulphur / 0†1800 °F[358a]<br>(followed at «dark emerald-green ranging to black») |
| | | mineral : pyrolusite[101]<br>rock : black (light brown tone), mat<br>powder : black (light brown tone), mat<br>origin : probably Nova Scotia, Canada<br><br><u>production process:</u><br>(followed from «very powerful emerald-green [brown tone]»)<br>2 g of pyrolusite + 2 g of sodium carbonate: |
| very powerful emerald-green<br>↓ | 2076 | 1600 °F / 3 h |
| more intense emerald-green<br>↓ | 2077 | 1600 °F / 4 h |
| darker emerald-green<br>↓ | 2078 | 1600 °F / 6 h |
| emerald-green still darker | 2079 | 1600 °F / 8 h |
| | | mineral : pyrolusite[101]<br>rock : black (light brown tone), mat<br>powder : black (light brown tone), mat<br>origin : probably Nova Scotia, Canada<br><br>mineral : sulphur<br>rock : brilliant yellow<br>powder : brilliant yellow<br>origin : unknown<br><br><u>production process:</u> |
| very powerful emerald-green<br>↓ | 2080 | 1 g of pyrolusite + 3 g of sodium carbonate + 1 g of sulphur / 1600 °F / 1 h<br><br>(followed from «dark greyish beige») |

| | | |
|---|---|---|
| very powerful emerald-green | 2081 | 1 g of pyrolusite + 3 g of sodium carbonate + 1 g of sulphur / 0↑1600 °F<br>(followed at «dark chocolate-brown») |
| extremely powerful emerald-green<br>↓<br>darker and more intense emerald-green | 2082<br><br>2083 | production process:<br>2 g of pyrolusite + 3 g of potassium carbonate[360a]:<br>0↑1500 °F[361a]<br><br>0↑1600 °F<br>(followed at «emerald-green [blue tone]») |
| dark emerald-green | 2084 | mineral : copper<br>rock : reddish brown, with metallic luster<br>powder : reddish brown, with metallic luster<br>origin : unknown<br><br>production process:<br>(followed from «greenish blue a little more intense than "intense greenish blue"»)<br>rock entirely covered with 1000 ml acetic acid / natural drying / removal of the crystals formed at the surface of the rock (colour of the crystals: pronounced emerald-green): 5 g of crystals + 25 ml ammonia / natural drying (intense greenish blue) / irradiated with gamma rays at 424.7 Mrad |
| dark and saturated emerald-green<br>↓<br>darker emerald-green | 2085<br><br>2086 | mineral : graphite<br>rock : dark grey, with metallic brilliance<br>powder : dark grey, with metallic brilliance<br>origin : Grenville, Québec<br><br>production process:<br>(followed from «dark bluish turquoise»)<br>1 g of graphite + 3 g of potassium carbonate:<br>0↑1700 °F[356a,359a]<br><br>0↑1800 °F |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «green [with "bluish green areas"]») |

| | | |
|---|---|---|
| dark emerald-green | 2087 | 2 g of molybdenite + 2 g of sodium carbonate / 1500 °F / 45 min. (intense bluish green) / irradiated with electrons at 302,831 rad[45] |
| | | mineral : pyrolusite[101]<br>rock : black (light brown tone), mat<br>powder : black (light brown tone), mat<br>origin : probably Nova Scotia, Canada<br><br>production process:<br>(followed from «brownish black»)<br>2 g of pyrolusite + 2 g of sodium carbonate: |
| very dark and powerful emerald-green<br>\| | 2088 | 0↑1600 °F + 1 h at 1600 °F |
| very dark and powerful emerald-green<br>\| | 2089 | 0↑1700 °F + 1 h at 1700 °F |
| very dark and very powerful emerald-green<br>\|<br>↓ | 2090 | 0↑1800 °F + 1 h at 1800 °F |
| very dark and very powerful emerald-green | 2091 | 0↑1900 °F + 1 h at 1900 °F |
| | | production process:<br>(followed from «blackish brown»)<br>2 g of pyrolusite + 2 g of potassium carbonate: |
| very dark and powerful emerald-green<br>\| | 2092 | 0↑1600 °F |
| emerald-green still more powerful<br>↓ | 2093 | 0↑1700 °F |
| emerald-green still more powerful | 2094 | 0↑1800 °F |
| | | production process:<br>1 g of pyrolusite + 3 g of potassium carbonate: |
| very dark and powerful emerald-green<br>\| | 2095 | 0↑1500 °F[362a] |

| | | |
|---|---|---|
| darker emerald-green | 2096 | 0↑1600 °F |
| ↓ | | |
| emerald-green more blackish | 2097 | 0↑1700 °F |
| ↓ | | |
| emerald-green still more powerful | 2098 | 0↑1800 °F |
| dark emerald-green, almost blackish | 2099 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «dark and powerful emerald-green») 10 g of galena + 20 g of sodium carbonate + 10 g of sulphur / 0↑2050 °F363a |
| mixture of particles | | |
| emerald-green / olive-green | 2100 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml nitric acid / soaking: 2 wk. / separation of the liquid (1st) and the solid / desiccation of the 1st liquid (colour of the 1st liquid: very intense emerald-green) / addition of 100 ml nitric acid to the same solid / soaking: 2 wk. / separation of the liquid (2nd) and the solid / desiccation of the 2nd liquid (colour of the 2nd liquid: mixture of particles: very vivid blue / acute greenish turquoise) / natural drying of the solid (colour of the solid: intense green [between «grass-green» and «Paris green »]) / the solid is irradiated with electrons at 162,431 rad |
| emerald-green (blue tone) | | |

341

| | | |
|---|---|---|
| very vivid emerald-green (blue tone) | 2101 | mineral : tremolite<br>rock : medium brown (evergreen tone)<br>powder : greyish beige<br>origin : Tetreault Mine, Montauban, Portneuf county, Québec<br><br>production process:<br>1 g of tremolite + 2 g of sodium carbonate / 0↑1800 °F<br>(followed at «grass-green») |
| very powerful emerald-green (blue tone) | 2101.1 | mineral : chalcopyrite<br>rock : brass-yellow, with metallic luster<br>powder : dark grey (with golden particles)<br>origin : Noranda Mine, Noranda, Abitibi, Québec<br><br>production process:<br>1 g of chalcopyrite + 6.50 g of powdered glass (spruce pine batch) / manual grinding / deposited on a ceramic plate at the state of a biscuit / heated in a furnace 0↑1000 °C in ambient air / slow cooling in the furnace |
| emerald-green (blue tone) a little darker than «very powerful emerald-green [blue tone]» | 2101.2 | production process:<br>1 g of chalcopyrite + 6.50 g of powdered glass (spruce pine batch) / manual grinding / deposited on a ceramic plate at the state of a biscuit / heated in a furnace 0↑1000 °C in ambient air / slow cooling in the furnace (very powerful emerald-green [blue tone]) / irradiated with gamma rays at:<br>2.47 Mrad |
| ↓ still a little darker | 2101.3 | 4.94 Mrad |
| ↓ still a little darker | 2101.4 | 7.41 Mrad |
| ↓ slightly more accentuated | 2101.5 | 9.88 Mrad |
| | | mineral : pyrolusite[101]<br>rock : black (light brown tone), mat<br>powder : black (light brown tone), mat<br>origin : probably Nova Scotia, Canada |

| | | |
|---|---|---|
| emerald-green (blue tone) darker and more saturated than «extremely powerful emerald-green» ↓ | 2102 | production process: (followed from «emerald-green darker and more intense than "extremely powerful emerald-green"») 2 g of pyrolusite + 3 g of potassium carbonate: 0↑1700 °F[364a] |
| emerald-green (blue tone), still more intense | 2103 | 0↑1800 °F |
| emerald-green (blue tone) very dark and intense | 2104 | mineral : zincite<br>rock : mixture of areas: dark grey / orange-red<br>powder : medium milky chocolate-brown (red tone)<br>origin : Franklin, New Jersey, United States<br><br>production process: (followed from «pale yellow [orange tone]») 2 g of zincite + 2 g of sodium carbonate: 0↑1500 °F + 30 min. at 1500 °F[367a] |
| emerald-green (blue tone) very dark and more intense | 2105 | 0↑1600 °F + 1 h at 1600 °F |
| emerald-green (blue tone) very dark and still more intense | 2106 | 0↑1700 °F + 1 h at 1700 °F |
| emerald-green (blue tone) and still more intense ↓ | 2107 | 0↑1800 °F + 1 h at 1800 °F[366a] |
| emerald-green (blue tone) still more intense | 2108 | 0↑1900 °F + 1 h at 1900 °F |
| | | production process: 2 g of zincite + 2 g of potassium carbonate: |

| | | |
|---|---|---|
| very dark and intense emerald-green (blue tone) | 2109 | 0↑1500 °F[367a] |
| dark emerald-green (blue tone) | 2110 | 0↑1600 °F[368a] |
| emerald-green (blue tone) still more intense | 2111 | 0↑1700 °F |
| emerald-green (blue tone) very intense | 2112 | 0↑1800 °F[369a,370a] |
| emerald-green (blue tone), darker than «blackish emerald-green (blue tone)» | 2113 | mineral : graphite<br>rock : dark grey, with metallic brilliance<br>powder : dark grey, with metallic brilliance<br>origin : Grenville, Québec<br><br>production process:<br>(followed from «emerald-green more blackish than "intense emerald-green"»)<br>1 g of graphite + 2 g of potassium carbonate / 0↑1800 °F |
| emerald-green (brown tone) | | |
| powerful emerald-green (brown tone) | 2114 | mineral : pyrolusite[101]<br>rock : black (light brown tone), mat<br>powder : black (light brown tone), mat<br>origin : probably Nova Scotia, Canada<br><br>production process:<br>2 g of pyrolusite + 2 g of sodium carbonate: 1600 °F / 1 h[371a] |
| very powerful emerald-green (diminished brown tone) | 2115 | 1600 °F / 2 h<br><br>(followed at «very powerful emerald-green») |
| green (orange tone) | | |
| | | mineral : Gaspé agate<br>rock : marbled nodule with shaded tints of |

| | | |
|---|---|---|
| | | white, pink and grey, slightly translucid<br>powder : very light pinkish grey<br>origin : Mont Lyall, Gaspésie, Québec<br><br>production process:<br>4 g of agate + 40 ml nitric acid / soaking: 1 wk. / separation of the liquid and the solid / natural drying (colour of the liquid: quite vivid greenish turquoise) / irradiated with electrons at: |
| pale green (orange tone) | 2116 | 164,800 rad |
| ↓ | | |
| pale green (orange tone) | 2117 | 305,200 rad[73] |
| | | mineral : bornite<br>rock : reddish brown (with localized green and bluish green oxidation)<br>powder : reddish brown<br>origin : Lac Musset, Fosse du Labrador, Québec<br><br>production process:<br>12 g of bornite + 40 ml nitric acid / soaking: 3 h / separation of the liquid (1st) and the solid / addition of 40 ml nitric acid to the same solid / soaking: 1 d. / separation of the liquid (2nd) and the solid / addition to the same solid of 40 ml nitric acid / soaking: 5 d. / separation of the liquid (3rd) and the solid / drying on sand bath (colour of the 2nd liquid: very dense and vivid blue) / irradiated with electrons at: |
| green (orange tone) | 2118 | 164,800 rad |
| ↓ | | |
| green (orange tone) | 2119 | 305,200 rad[73] |
| | | mineral : bloody agate<br>rock : dark grass-green, slightly translucid<br>powder : light grey (light green tone)<br>origin : India<br><br>production process: |
| medium green (orange tone) | 2120 | 1 g of agate + 1 cc of transparent synthetic enamel paint for the car / manual grinding / application on a piece of steel sheet for the car's body, measuring 1" x 1" (greenish grey) / irradiated with gamma rays at 102.4 Mrad<br>(followed at «dark greyish green») |
| khaki-green | | |

| | | |
|---|---|---|
| | | mineral : asbestos[4]<br>rock : dark grey (green reflection)<br>powder : light grey (green reflection)<br>origin : Asbestos Corporation Ltd., Thetford Mines, Québec |
| light khaki-green | 2121 | production process:<br>2 g of asbestos + 2 g of sodium carbonate / 1800 °F / 1 h<br>(followed at «green [with brown particles]») |
| light khaki-green | 2122 | production process:<br>(followed at «chamois [orange tone]»)<br>2 g of asbestos + 2 g of sodium carbonate / 0↑1800 °F + 1 h at 1800 °F<br>(followed at «very light chamois [light orange tone]») |
| | | mineral : crocidolite<br>rock : dark bluish grey<br>powder : pale bluish grey<br>origin : Griqualand district, South Africa |
| light khaki-green<br>↓ | 2123 | production process:<br>(followed from «brown [orange tone]»)<br>2 g of crocidolite + 2 g of sodium carbonate / 1800 °F / 1 h[350] |
| light khaki-green | 2124 | 2 g of crocidolite + 2 g of sodium carbonate / 1900 °F / 1 h[350] |
| light khaki-green | 2125 | production process:<br>(followed from «medium brown [orange tone]»)<br>2 g of crocidolite + 2 g of sodium carbonate / 0↑1800 °F + 1 h at 1800 °F[350] |
| | | mineral : amazonite<br>rock : light greenish turquoise<br>powder : white (turquoise reflection)<br>origin : Lac Sains , Témiscamingue, Québec |
| khaki-green (with orange areas) | 2126 | production process:<br>(followed from «pale brown [orange tone]»)<br>1 g of amazonite + 1 cc of transparent synthetic enamel paint for the car[94] / manual grinding / application on a piece of steel sheet for the car's body measuring 1" x 1" (very light grey) / irradiated with gamma rays at 360 Mrad[351] |
| | | mineral : beryl<br>rock : intense grass-green, slightly translucid<br>powder : greenish grey<br>origin : unknown |

346

| | | |
|---|---|---|
| khaki-green | 2127 | production process:<br>1 g of beryl + 1 cc of synthetic transparent enamel paint for the car[94] / manual grinding / application on a piece of steel sheet for the car's body, measuring 1" x 1" (khaki-green) / irradiated with gamma rays at 5 Mrad<br>(followed at «khaki-green [light orange tone]») |
| khaki-green | 2128 | mineral : chromite<br>rock : blackish grey<br>powder : medium brownish grey<br>origin : Black Lake, near Thetford Mines, Québec<br><br>production process:<br>2 g of chromite + 2 g of potassium carbonate / 0↑1500 °F<br>(followed at «dark olive-green») |
| khaki-green | 2129 | mineral : smaltite[25], variety of skutterudite<br>rock : dark iron-grey, with silver metallic brilliance<br>powder : dark grey<br>origin : Cobalt, Ontario<br><br>production process:<br>3 g of smaltite + 80 ml hydrochloric acid / soaking: 2 wk. / separation of the liquid and the solid / drying on hot plate / colour of the solid<br>(followed at «very vivid green») |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «brownish orange [green tone]»)<br>50 g of asbestos + 200 ml hydrochloric acid <u>or</u> asbestos entirely covered with hydrochloric acid / soaking: 1 wk. / drying on hot plate (vivid yellow): 3 g + 4 g of sodium carbonate: |
| khaki-green<br>↓ | 2130 | 1800 °F / 45 min. |
| darker khaki-green<br>↓ | 2131 | 1800 °F / 50 min. |
| darker and greener khaki-green | 2132 | 1800 °F / 55 min.<br>(followed at «mixture of particles: khaki-green / greenish turquoise») |

| | | |
|---|---|---|
| | | mineral : halite[41]<br>rock : colourless<br>powder : colourless<br>origin : Seleine Mine, Iles-de-la-Madeleine, Québec<br><br>production process:<br>(followed from «medium khaki-brown»)<br>1 g of halite + 1 cc of synthetic transparent enamel paint[94] for the car / manual grinding / application on a piece of steel sheet for the car's body, measuring 1" x 1" (cream) / irradiated with gamma rays[351,352] at: |
| khaki-green<br>↓ | 2133 | 5 Mrad |
| khaki-green a little darker<br>↓ | 2134 | 7.54 Mrad |
| khaki-green still a little darker | 2135 | 10 Mrad<br>(followed at «brownish khaki-green») |
| | 2136 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «apple-green [light yellow tone]») |
| khaki-green [between «orange» and «green»] | 2137 | 0↑900 °F (grey [light beige tone]): 5 g + 25 ml nitric acid / soaking: 3 d. / drying on hot plate<br>(followed at «light orange») |
| | | mineral : antigorite<br>rock : pale yellowish green<br>powder : very pale greenish yellow<br>origin : Canadian Refractories Mine, Kilmar, Québec<br><br>production process:<br>1 g of antigorite + 1 cc synthetic transparent enamel paint for the car[94] / manual grinding / application on a piece of steel sheet for the car's body, measuring 1" x 1" (khaki-green) / irradiated with gamma rays[351,352] at: |
| khaki-green a little more dark than «khaki-green»<br>↓ | 2138 | 5 Mrad |

| | | |
|---|---|---|
| khaki-green still a little darker | 2139 | 10 Mrad<br>(followed at «brownish khaki-green») |
| medium khaki-green | 2140 | mineral : crocidolite<br>rock : dark bluish grey<br>powder : pale bluish grey<br>origin : Griqualand district, South Africa<br><br>production process:<br>2 g of crocidolite + 2 g of sodium carbonate / 1200 °F / 1 h[350]<br>(followed at «brown ochre [reddish orange tone]») |
| medium khaki-green | 2141 | mineral : chalcopyrite<br>rock : brass-yellow, with metallic luster<br>powder : dark grey (with golden particles)<br>origin : Noranda Mines, Noranda, Abitibi, Québec<br><br>production process:<br>(followed from «intense phtalo-green»)<br>1 g of chalcopyrite + 40 ml nitric acid / natural drying / colour of the solid |
| | | mineral : beryl<br>rock : light blue (near turquoise), slightly translucid<br>powder : light grey<br>origin : Lacorne district, Abitibi, Québec<br><br>production process:<br>(followed from «cream [beige tone and green reflection]»)<br>1 g of beryl + 1 cc of synthetic transparent enamel paint for the car[94] / manual grinding / application on a piece of steel sheet for the car's body, measuring 1" x 1" (cream [beige tone]) / irradiated with gamma[351,352] rays at: |
| medium khaki-green<br>↓ | 2142 | 10 Mrad |
| khaki-green more intense | 2143 | 57.4 Mrad<br>(followed at «brown ochre [rusty tone]») |
| | | mineral : barite<br>rock : pinkish white<br>powder : white<br>origin : Niobec Mine, Saint-Honoré, Saguenay, Québec<br><br>mineral : chrome<br>powder : light grey, with metallic brilliance |

| | | |
|---|---|---|
| medium khaki-green | 2144 | production process:<br>1.50 g of barite + .50 g of chrome / 0↑1900 °F |
| khaki-green a little darker than «medium khaki-green»<br>↓ | 2145 | production process:<br>1.50 g of barite + .50 g of chrome / 0↑1900 °F (medium khaki-green) / irradiated with electrons at:<br>162,431 rad |
| khaki-green much more accentuated | 2146 | 302,831 rad[45] |
| dark khaki-green | 2147 | mineral : serpentine<br>rock : yellowish green<br>powder : light greenish yellow<br>origin : probably Thetford Mines, Eastern Townships, Québec<br><br>production process:<br>1 g of serpentine + 1 cc of synthetic transparent enamel paint for the car[94] / manual grinding / application on a piece of steel sheet for the car's body, measuring 1" x 1" (pastel greyish green [almost white]) / irradiated with gamma rays at 57.4 Mrad<br>(followed at «dark khaki-green [light brown tone]») |
| mixture of particles | | |
| khaki-green / greenish turquoise<br>↓ | 2148 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «khaki-green»)<br>50 g of asbestos + 200 ml hydrochloric acid or asbestos entirely covered with hydrochloric acid / soaking: 1 wk. / drying on hot plate (vivid yellow): 3 g + 4 g of sodium carbonate:<br>1800 °F / 1 h |
| khaki-green more green / greenish turquoise more green | 2149 | 1800 °F / 1:30 h |

| | | |
|---|---|---|
| khaki-green (yellow tone) | | |
| dark khaki-green (yellow reflection) | 2149.1 | mineral : chrome<br>powder : light grey, with metallic brilliance<br><br>production process:<br>1 g of chrome + 6.50 g of powdered glass (spruce pine batch) / manual grinding / deposited on a ceramic plate at the state of a biscuit / heated in a furnace 0↑1000 °C in ambient air / slow cooling in furnace |
| khaki-green (yellow reflection) darker than «dark khaki-green (yellow reflection)» | 2149.2 | production process:<br>1 g of chrome + 6.50 g of powdered glass (spruce pine batch)/manual grinding / deposited on a ceramic plate at the state of a biscuit / heated in a furnace 0↑1000 °C in ambient air / slow cooling in furnace (dark khaki-green [yellow reflection]) / irradiation with gamma rays at 4.94 Mrad (followed at «dark green») |
| khaki-green (orange tone) | | |
| khaki-green (light orange tone) more intense than «khaki-green (orange tone)» | 2150 | mineral : beryl<br>rock : intense grass-green, slightly translucid<br>powder : greenish grey<br>origin : unknown<br><br>production process:<br>(followed from «khaki-green»)<br>1 g of beryl + 1 cc of synthetic transparent enamel paint for the car[94] / manual grinding / application on a piece of steel sheet for the car's body, measuring 1" x 1" (khaki-green) / irradiated with gamma rays at 10 Mrad<br>(followed at «khaki-green [brown tone]») |
| khaki-green (brown tone) | | |
| khaki-green (brown tone) more pale than «khaki-green (brown tone) darker than | 2151 | mineral : antigorite<br>rock : pale yellowish green<br>powder : very pale greenish yellow<br>origin : Canadian Refractories Mine, Kilmar, Québec<br><br>production process:<br>(followed from «khaki-green a little darker than "khaki-green"»)<br>1 g of antigorite + 1 cc synthetic transparent enamel paint for the car[94] / manual grinding / application on a piece of steel sheet for the car's body, measuring 1" x 1" (khaki-green) / irradiated with gamma rays[351,352] at 57.4 Mrad |

| | | |
|---|---|---|
| "knaki-green (brown tone)"» | | (followed at «brownish khaki-green [orange tone]») |
| khaki-green (very light brown tone) much more intense than «khaki-green (brown tone)» | 2152 | mineral : beryl<br>rock : intense grass-green, slightly translucid<br>powder : greenish grey<br>origin : unknown<br><br>production process:<br>(followed from «khaki-green [orange tone]»)<br>1 g of beryl + 1 cc of synthetic transparent enamel paint for the car[94] / manual grinding / application on a piece of steel sheet for the car's body, measuring 1" x 1" (khaki-green) / irradiated with gamma rays at 57.4 Mrad<br>(followed at «brownish green [orange tone] or orange [brown tone and green reflection]») |
| | | mineral : halite[41]<br>rock : colourless<br>powder : colourless<br>origin : Seleine Mine, Iles-de-la-Madeleine, Québec<br><br>production process:<br>(followed from «khaki-green a little darker than "khaki-green"»)<br>1 g of halite + 1 cc of synthetic transparent enamel paint for the car[94] / manual grinding / application on a piece of steel sheet for the car's body, measuring 1" x 1" (cream) / irradiated with gamma rays[351,352] at: |
| khaki-green (brown tone) a little more intense and dark than «khaki-green (brown tone) darker than "khaki-green (brown tone)"» | 2153 | 11.31 Mrad |
| ↓ | | |
| khaki-green a little more accentuated | 2154 | 15.08 Mrad |
| ↓ | | |
| khaki-green (brown tone) a little more accentuated and dark | 2155 | 18.85 Mrad |
| ↓ | | |
| khaki-green | 2156 | 57.4 Mrad |

352

| | | |
|---|---|---|
| (brown tone) still darker<br>↓ | | |
| khaki-green (brown tone) still darker<br>↓ | 2157 | 102.4 Mrad |
| khaki-green (brown tone) still darker | 2158 | 360 Mrad |
| khaki-green (brown tone) more intense and darker than «medium khaki-green (brown tone)» | 2159 | mineral : barite<br>rock : pinkish white<br>powder : white<br>origin : Niobec Mine, Saint-Honoré, Saguenay, Québec<br><br>mineral : chrome<br>powder : light grey, with metallic brilliance<br><br>production process:<br>1.50 g of barite + .50 g of chrome / 0↑1900 °F (medium khaki-green) / irradiated with gamma rays at 424.7 Mrad[81] |
| dark khaki-green (light brown tone) | 2160 | mineral : serpentine<br>rock : yellowish green<br>powder : light greenish yellow<br>origin : probably Thetford Mines, Eastern Townships, Québec<br><br>production process:<br>(followed from «dark khaki-green»)<br>1 g of serpentine + 1 cc of synthetic transparent enamel paint for the car[94] / manual grinding / application on a piece of steel sheet for the car's body, measuring 1" x 1" (pastel greyish green [almost white]) / irradiated with gamma rays at 102.4 Mrad<br>(followed at «rusty brown») |
| brownish khaki-green (orange tone) | | |
| | | mineral : antigorite<br>rock : pale yellowish green<br>powder : very pale greenish yellow<br>origin : Canadian Refractories Mine, Kilmar, Québec |

353

| | | |
|---|---|---|
| brownish khaki-green (orange tone) | 2161 | production process:<br>(followed from «khaki-green [brown tone]»)<br>1 g of antigorite + 1 cc of synthetic transparent enamel paint for the car[94] / manual grinding / application on a piece of steel sheet for the car's body, measuring 1" x 1" (khaki-green) / irradiated with gamma rays[351,352] at 102.4 Mrad<br>(followed at «brown [orange tone]») |
| medium brownish khaki-green (orange tone) | 2162 | mineral : crocidolite<br>rock : dark bluish grey<br>powder : pale bluish grey<br>origin : Griqualand district, South Africa<br><br>production process:<br>(followed from «light beige [orange tone]»)<br>2 g of crocidolite + 2 g of sodium carbonate / 0↑1200 °F + 1 h at 1200 °F<br>(followed at «brown ochre [reddish orange tone]») |
| khaki-green (greyish brown tone) | | |
| accentuated khaki-green (light greyish brown tone) | 2163 | mineral : chrysocolla<br>rock : light greenish turquoise<br>powder : very light greenish turquoise<br>origin : Mexico<br><br>production process:<br>(followed from «dark greyish brown [green reflection]»)<br>2 g of chrysocolla + 2 g of sodium carbonate / 900 °F / 1 h (dark lichen-green, almost black) / irradiated with gamma rays at 424.7 Mrad |
| khaki-green (grey tone) | | |
| khaki-green (grey tone) much more accentuated than «light khaki-green (grey tone)» | 2164 | mineral : fuel oil soot[86]<br>powder : profound brownish black<br>origin : boiler room of Laval University, city of Québec, Québec<br><br>production process:<br>(followed from «greyish brown [light green tone]»)<br>2 g of soot + 20 ml sulphuric acid / soaking: 24 h / deposited on a hot plate / brought to boiling point[345] / separation of the liquid and the solid / drying on hot plate (colour of the liquid[77]: grass-green [grey tone], cold and mat): 3 g + 50 cc of transparent polyester resin + 1% of catalyst / manual grinding / moulding / hardening (light greyish green) / irradiated with electrons at 305,082 rad[354] |

354

| green (beige tone) | | |
|---|---|---|
| very light green [near beige] | 2165 | mineral : calcite[11,318,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «light yellow»)<br>1.50 g of calcite + .50 g of chrome / grinded and moistened with water until it reaches the consistency of a paste / 1300 °F / 1 h[294,319]<br>(followed at «very light green») |
| very light green [near beige] | 2166 | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «greenish beige» and «very light beige [light green tone]»)<br>1.50 g of cement + .50 g of chrome / grinded and moistened with water until it reaches the consistency of a paste / 1500 °F / 1 h |
| very light green [near beige] | 2167 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «greenish grey»)<br>1.50 g of cement + .50 g of chrome / grinded and moistened with water until it reaches the consistency of a paste / 1500 °F / 1 h |
| | | mineral : calcite[11,318,319]<br>powder : white<br>origin : Calcite du Nord Company, Saint-Eugène de Mistassini, Lac St.-Jean, Québec<br><br>mineral : chrome<br>powder : light grey, with metallic brilliance |

| | | |
|---|---|---|
| green (beige tone) more pale than «light green (beige tone)» | 2168 | production process:<br>(followed from «grass-green more pale than "light grass-green"»)<br>1.50 g of calcite + .50 g of chrome / 1650 °F / 1 h (light grass-green) / irradiated with gamma rays at 550.22 Mrad |
| green (beige tone) more pale than «light green (beige tone)» | 2169 | mineral : chromite[294]<br>rock : dark grey<br>powder : dark grey<br>origin : Black Lake, Eastern Townships, Québec<br><br>mineral : calcite[11,319]<br>powder : white<br>origin : Calcite du Nord Company, Saint-Eugène de Mistassini, Lac Saint-Jean, Québec<br><br>production process:<br>(followed from «grass-green»)<br>.50 g of chromite + 1.50 g of calcite / 0↑1900 °F (light grass-green) / irradiated with gamma rays at 424.7 Mrad |
| light green (light beige tone) | 2170 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «creamy beige [green tone]»)<br>2 g of wilsonite + 2 g of sodium carbonate / / 0↑1500 °F + 15 min. at 1500 °F<br>(followed at «light green») |
| light green (very light beige tone) | 2171 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 mo. / natural drying (colour of the solid: light green) / irradiated with gamma rays: 64.7 Mrad |
| ↓ | | |
| green (beige tone) a little darker | 2172 | 424.7 Mrad |

| | | |
|---|---|---|
| green (beige tone) | 2173 | mineral : chalcocite<br>rock : dark iron-grey (with localized turquoise oxidation)<br>powder : dark iron-grey<br>origin : Butte, Montana, United States<br><br>production process:<br>3 g of chalcocite + 20 ml of a cyanide solution[255] / natural drying (colour of the solid: greenish turquoise) / irradiated with gamma rays at 424.7 Mrad |
| green (beige tone) more accentuated than «green (beige tone)» | 2174 | mineral : apatite<br>rock : light grass-green (light blue and yellow tones), very slightly translucid<br>powder : very light grey (light green tone)<br>origin : region of Buckingham, Québec<br><br>production process:<br>(followed from «cold and very light evergreen»)<br>powder irradiated with gamma rays at 604.53 Mrad |
| green (beige tone) more pale than «medium green (beige tone)» | 2175 | mineral : amazon stone<br>rock : light greenish turquoise, translucid<br>powder : white (turquoise reflection)<br>origin : unknown<br><br>production process:<br>4 g of amazon stone + 40 ml hydrochloric acid / soaking: 1 wk. / separation of the liquid and the solid / natural drying (colour of the liquid: medium apple-green) / irradiated with gamma rays at 64.7 Mrad<br>(followed at «mixture of particles: beige / brown / beige [orange tone]») |
| green (brown tone) | | |
| brownish green darker than «pale brownish green» | 2176 | mineral : apatite<br>rock : pale brownish green<br>powder : very light greyish green<br>origin : Black Lake, Thetford county, Québec<br><br>production process:<br>rock irradiated with gamma rays[67] at 244.53 Mrad[433]<br>(followed at «brown») |
| | | mineral : actinolite |

| | | |
|---|---|---|
| light brownish green | 2177 | rock : cold and light evergreen<br>powder : light grey (light green tone)<br>origin : erratic bloc found at Saint-Philémon, near Dorchester, Québec<br><br>production process:<br>3 g of actinolite + 50 ml sulphuric acid / soaking: 2 wk. / drying on hot plate |
| green (light brown tone) a little more accentuated than «light brownish tone» | 2178 | mineral : serpentine<br>rock : yellowish green<br>powder : light greenish yellow<br>origin : probably Thetford-Mines, Eastern Townships, Québec<br><br>production process:<br>(followed from «greenish yellow [light brown tone]»)<br>powder irradiated with gamma rays at 424.7 Mrad |
| green (light brown tone) more accentuated than «light and vivid brownish green» | 2179 | mineral : calcite[11,318,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>.10 g of calcite + .50 g of chrome / 1700 °F / 1 h (yellowish green): .30 g + 50 cc of transparent polyester resin + 1% of catalyst / manual grinding / moulding / hardening (light and vivid apple-green) / irradiated with electrons at 155,082 rad (followed at «apple-green more intense et a little darker than "light apple-green"») |
| brownish green darker than «light brownish green» | 2180 | mineral : actinolite<br>rock : cold and light evergreen<br>powder : light grey (light green tone)<br>origin : erratic bloc found at Saint-Philémon, near Dorchester, Québec<br><br>production process:<br>(followed from «greyish green»)<br>powder irradiated with gamma rays at 424.7 Mrad |

| | | |
|---|---|---|
| brownish green | 2181 | production process:<br>2 g of actinolite + 2 g of sodium carbonate / 1900 °F / 1 h[355] |
| | | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec |
| brownish green | 2182 | production process:<br>rock irradiated with electrons at 164,800 rad[356] |
| | | mineral : green grossular garnet<br>rock : light and luminous phtalo-green[217a]<br>origin : Jeffrey Mine, Asbestos (presently J.-M. Asbestos), Québec |
| | | production process:<br>(followed from «yellowish green»)<br>green mineralized mass[357], wrapping the garnet, irradiated with gamma rays at: |
| green (light brown tone) | 2183 | 201.6 Mrad |
| ↓ | | |
| green (accentuated brown tone) | 2184 | 247.6 Mrad |
| | | mineral : galena<br>rock : dark grey, with metallic brilliance<br>powder : dark grey, with metallic brilliance<br>origin : Trail, British Columbia |
| brownish green | 2185 | production process:<br>(followed from «green a little lighter than "dark green"»)<br>4 g of galena powder deposited on a piece of stainless steel measuring 1" x 1" / 1400 °F / 20 min. / immediately removed[280]<br>(followed at «caramel-brown», «black» [copper - black plate], «grey» [aluminium] and «brown» [brass - galvanized sheet]») |
| | 2186 | mineral : serpentine<br>rock : pronounced yellowish green (olive-green type)<br>origin : Lac Saint-Jean, Québec |

359

| | | |
|---|---|---|
| brownish green | 2187 | <u>production process:</u><br>(followed from «yellowish green more accentuated than "pronounced yellowish green"»)<br>rock irradiated with gamma rays at 122.984 Mrad<br>(followed at «dark olive-green») |
| | 2188 | mineral : iron pyrite<br>powder : greyish brown, with a golden yellow metallic brilliance<br>origin : Rigaud seigniory, Beauce county, Québec<br><br><u>production process:</u><br>4 g of iron pyrite + 25 ml hydrochloric acid / soaking: 3 d. / drying on hot plate (brown [light green tone]) / irradiated with gamma rays at: |
| brownish green<br>↓ | 2189 | 63.88 Mrad |
| brownish green darker than «brownish green» | 2190 | 423.88 Mrad |
| | | mineral : cement[82]<br>powder : medium cold grey<br>origin : Union des Carrières, Limoilou, Québec<br><br>mineral : chrome<br>powder : light grey, with metallic brilliance<br><br><u>production process:</u><br>(followed from «olive-green») |
| brownish green | 2191 | 1.50 g of cement + .25 g of chrome / 1950 °F / 1 h |
| brownish green [brown tone more accentuated] | 2192 | 1.50 g of cement + .50 g of chrome / 1950 °F / 1 h |
| brownish green [brown tone still more accentuated] | 2193 | 1.50 g of cement + .50 g of chrome / 2000 °F / 1 h<br><br>(followed at «dark brownish green») |
| brownish green | 2194 | 1.50 g of cement + .50 g of chrome / 2000 °F / 2 h |
| brownish green [accentuated brown tone] | 2195 | 1.50 g of cement + .50 g of chrome / 2000 °F / 2:30 h |
| brownish green [brown tone still | 2196 | 1.50 g of cement + .50 g of chrome / 2000 °F / 4 h |

| | | |
|---|---|---|
| more accentuated] ↓ | | |
| brownish green [brown tone still more accentuated] ↓ | 2197 | 1.50 g of cement + .50 g of chrome / 2000 °F / 6 h |
| brownish green [brown tone still more accentuated] ↓ | 2198 | 1.50 g of cement + .50 g of chrome / 2000 °F / 8 h |
| brownish green [brown tone still more accentuated] | 2199 | 1.50 g of cement + .50 g of chrome / 2000 °F / 10 h[358] |
| medium brownish green | 2200 | mineral : agate<br>rock : dark grass-green, slightly translucid<br>powder : light grey (light green tone)<br>origin : bank of St.-Lawrence river, region of Maria, Gaspésie, Québec<br><br><u>production process:</u><br>(followed from «grass-green [grey tone]»)<br>powder irradiated with gamma rays at 604.53 Mrad |
| dark brownish green ↓ | 2201 | mineral : cement[82]<br>powder : medium cold grey<br>origin : Union des Carrières, Limoilou, Québec<br><br>mineral : chrome<br>powder : light grey, with metallic brilliance<br><br><u>production process:</u><br>(followed from «brownish green»)<br>1.50 g of cement + .25 g of chrome / 2050 °F / 1 h<br>(followed at «greenish brown») |
| dark green (light brown tone) | 2202 | (followed from «greenish brown»)<br>1.50 g of cement + .25 g of chrome / 2150 °F / 1 h<br>(followed at «greenish brown still more brown than "greenish brown"») |
| | | mineral : bloody agate<br>rock : dark grass-green, slightly translucid<br>powder : light grey (light green tone)<br>origin : India |

| | | |
|---|---|---|
| dark brownish green | 2203 | <u>production process:</u><br>(followed from «olive-green [brown tone]»)<br>8 g of agate + 40 ml hydrochloric acid / soaking: 1 wk. / separation of the liquid and the solid / natural drying (colour of the solid: vivid apple-green) / irradiated with gamma rays at 424.7 Mrad |
| dark brownish green | 2204 | <u>production process:</u><br>(followed from «grass-green [brown tone]»)<br>8 g of agate + 40 ml nitric acid / soaking: 1 wk. / separation of the liquid and the solid / natural drying (colour of the solid: accentuated grass-green) / irradiated with gamma rays at 424.7 Mrad |
| dark brownish green | 2205 | <u>production process:</u><br>(followed from «dark grass-green [brown tone]»)<br>8 g of agate + 40 ml sulphuric acid / soaking: 1 wk. / drying on hot plate (dark grass-green) / irradiated with gamma rays at 393.88 Mrad |
| dark brownish green | 2206 | mineral : hornblende<br>rock : medium evergreen (light grey tone), with vitreous luster<br>powder : medium cold grey (light green tone)<br>origin : Abitibi, Québec<br><br><u>production process:</u><br>rock irradiated with gamma rays at 423.88 Mrad |
| | 2207 | mineral : shale (formation of Sillery[359])<br>rock : brownish red<br>powder : pinkish brown, mat<br>origin : bank of St.-Lawrence river, at Berthier-Sur-Mer at the rear of the Dénechaud manor, Québec |
| dark brownish green | 2208 | <u>production process:</u><br>15 g of shale + 100 ml hydrochloric acid / soaking: 3 mo. / natural drying |
| brownish green (yellow tone) | | |
| brownish green | 2208.1 | mineral : uraninite<br>rock : medium chocolate-brown (red Bordeau tone)<br>powder : medium milky chocolate-brown<br>origin : Yellowknife, Canada<br><br><u>production process:</u><br>1 g of uraninite + 6.50 g of powdered glass |

362

| | | |
|---|---|---|
| (yellow reflection) | | (spruce pine batch) / manual grinding / deposited on a plate of ceramic at the state of a biscuit / heating in a furnace 0↑1000 °C in ambient air / slow cooling in furnace |
| brownish green (orange tone) | | |
| brownish green (orange tone) or greenish brown (orange tone) [colour between "green" and "brown" (orange tone)] | 2209 | mineral : beryl<br>rock : intense grass-green, slightly translucid<br>powder : greenish grey<br>origin : unknown<br><br>production process:<br>(followed from «khaki-green [very light brown tone]»)<br>1 g of beryl + 1 cc of synthetic transparent enamel paint for the car[94] / manual grinding / application on a piece of steel sheet for the car's body measuring 1" x 1" (khaki-green) / irradiated with gamma rays at 102.4 Mrad[351,352]<br><br>(followed at «medium brown [orange tone]») |
| brownish green (amber tone) | | |
| brownish green (amber tone), more intense and darker than «very, very light brownish green (amber tone)» | 2210 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «very light greyish beige or very light grey [beige tone]»)<br>2 g of fluorine + 20 ml hydrochloric acid / soaking: 3 d. / drying on hot plate (milky white [pink reflection]): .2 g + 50 cc of transparent polyester resin + 1% of catalyst / manual grinding / hardening (very, very light greenish grey) / irradiated with electrons at 305,082 rad[354] |
| mossy brownish green | | |
| | | mineral : chromite[294]<br>rock : dark grey<br>powder : dark grey<br>origin : Black Lake, Eastern Townships, Québec<br><br>mineral : cement[269]<br>powder : medium brownish grey<br>origin : CALCO, Charlesbourg, Québec |

| | | |
|---|---|---|
| medium mossy brownish green | 2211 | production process: (followed from «grass-green») .50 g of chromite + 1.50 g of cement / 1000 °C / 1 h |
| mossy brownish green darker than «medium mossy brownish green» | 2212 | production process: .50 g of chromite + 1.50 g of cement / 1000 °C / 1 h (medium mossy brownish green) / irradiated with gamma rays at 64.7 Mrad (followed at «dark greyish beige [green tone]») |
| brownish green (grey tone) | | |
| dark brownish green (accentuated grey tone) | 2213 | mineral : sodalite<br>rock : cold light blue<br>powder : light grey (light blue tone)<br>origin : Bancroft, Ontario<br><br>mineral : chrome<br>powder : light grey, with metallic brilliance<br><br>production process:<br>1 g of sodalite + 1 g of chrome / 2000 °F / 45 min. |
| mossy green | | |
| pale mossy green | 2214 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «beige [orange tone] lighter than "dark beige [orange tone]"»)<br>2 g of iron sulphide - nickel + 2 g of sodium carbonate:<br>0↑1400 °F + 1 h at 1400 °F |
| ↓ more accentuated mossy green | 2215 | 0↑1500 °F + 5 min. at 1500 °F |
| ↓ mossy green still more accentuated | 2216 | 0↑1500 °F + 10 min. at 1500 °F |
| ↓ mossy green still more accentuated ↓ | 2217 | 0↑1500 °F + 20 min. at 1500 °F |

364

| | | |
|---|---|---|
| mossy green still more accentuated | 2218 | 0↑1500 °F + 1 h at 1500 °F (followed at «orange [light green tone]») |
| | | mineral : blue lace agate<br>rock : light violet-blue, slightly translucid<br>powder : very light grey<br>origin : Africa<br><br>mineral : sulphur<br>rock : brilliant yellow<br>powder : brilliant yellow<br>origin : unknown<br><br>production process: |
| mossy green | 2219 | 1 g of agate + 1 g of sulphur / 1600 °F / 1 h |
| | | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : Africa<br><br>production process:<br>(followed from «dark iron-grey») |
| mossy green<br>↓ | 2220 | 1 g of antigorite + 2 g of sodium carbonate + 1 g of sulphur / 0↑1600 °F |
| mossy green [of a different tone] | 2221 | 1 g of antigorite + 2 g of sodium carbonate + 1 g of sulphur / 0↑1600 °F (mossy green) / cooling / 0↑1700 °F<br>(followed at «blackish chocolate-brown») |
| | | mineral : bornite<br>rock : reddish brown (with localized green and bluish green oxidation)<br>powder : reddish brown<br>origin : Lac Musset, Fosse du Labrador, Québec<br><br>production process:<br>(followed from «mixture of particles: light azure-blue / green [between "apple-green" and "mint-green"]», from «vivid and dark emerald-blue» and «mixture of particles: medium phtalo-green / intense greenish blue») |
| mossy green | 2222 | 2 g of bornite + 25 ml nitric acid / soaking: 6 d. |

| | | |
|---|---|---|
| | | / separation of the liquid and the solid / natural drying / colour of the solid[313] |
| mossy bottle-green | 2223 | mineral : copper<br>rock : reddish brown, with metallic luster<br>powder : reddish brown, with metallic luster<br>origin : unknown<br><br>production process:<br>rock entirely covered with 1000 ml acetic acid / natural drying / removal of the crystals formed at the surface of the rock (colour of the crystals: pronounced emerald-green) / 300 °F / 10 min.[360] (followed at «mixture of particles: brown / green») |
| mossy green<br>↓ | 2224 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>0↑1400 °F / slow cooling in furnace (indian red[107]): 8 g + 96 g of sulphur / 1500 °F / 1 h (dark brown [violet tone]): .50 g + .50 g of titanium dioxide / 1600 °F / 1 h |
| mossy green | 2225 | 0↑1400 °F / slow cooling in furnace (indian red[107]): 8 g + 96 g of sulphur / 1500 °F / 1 h (dark brown [violet tone]): .50 g + .50 g of titanium dioxide / 1700 °F / 1 h |
| mossy green | 2226 | mineral : goethite[106]<br>powder : rusty orange<br>orange : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>0↑1400 °F / slow cooling in furnace (indian |

| | | |
|---|---|---|
| | | red[107]): 8 g + 96 g of sulphur / 1500 °F / 1 h (dark brown [violet tone]): .50 g + .50 g of sodium carbonate / 1600 °F / 1 h |
| mossy green | 2227 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑900 °F + 1 h at 900 °F (light greenish yellow or light yellowish green) / irradiated with gamma rays at 63.88 Mrad<br>(followed at «bluish green [grey tone]») |
| mossy green more intense than «mossy green» | 2228 | mineral : malachite<br>rock : ribboned variety of accentuated mint-green<br>powder : light and brilliant mint-green<br>origin : Katanga province, at 300 km from Lubumbachai, Zair, Africa<br><br>production process:<br>5 g of malachite + 25 ml ammonia / natural drying (mossy greenish turquoise) / irradiated with gamma rays at 64.7 Mrad<br>(followed at «green more green and darker than "green"») |
| medium mossy green | 2229 | mineral : cobalt sulphide[597]<br>rock : dark grey, with metallic brilliance<br>powder : dark grey<br>origin : Cobalt, Ontario<br><br>mineral : chrome<br>powder : light grey, with metallic brilliance<br><br>production process:<br>1 g of cobalt sulphide + 1 g of chrome / 2000 °F / 20 min. |
| accentuated mossy green | 2230 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑1100 °F + 1 h at 1100 °F (creamy yellow [light |

| | | |
|---|---|---|
| | | green tone]) / irradiated with gamma rays at 63.88 Mrad<br>(followed at «greyish blue [green tone], dark and intense») |
| dark and accentuated mossy green | 2231 | <u>production process:</u><br>(followed from «very pronounced mossy green [light blue tone]»)<br>2 g of molybdenite + 2 g of sodium carbonate / 0↑1000 °F + 1 h at 1000 °F (light yellow [light green tone]) / irradiated with gamma rays at 424.7 Mrad |
| mixture of particles | | |
| pale mossy green / white / light beige / dark iron-grey | 2232 | mineral : chromite<br>rock : blackish grey<br>powder : medium brownish grey<br>origin : Black Lake, near Thetford Mines, Québec<br><br><u>production process:</u><br>(followed from «dark iron-grey»)<br>0↑1900 °F (medium chocolate-brown): 1 g + 50 ml sulphuric acid / soaking: 2 wk. / drying on hot plate (profound green) / irradiated with gamma rays at 424.7 Mrad |
| mossy green (blue tone) | | |
| very pronounced mossy green (light blue tone) | 2233 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>2 g of molybdenite + 2 g of sodium carbonate / 0↑1000 °F + 1 h at 1000 °F (light yellow [light green tone]) / irradiated with gamma rays at 64.7 Mrad<br>(followed at «dark and accentuated mossy green») |
| lichen-green | | |
| | | mineral : malachite<br>rock : ribboned variety of accentuated mint-green<br>powder : light and brilliant mint-green<br>origin : Katanga province, at 300 km from Lubumbachai, Zair, Africa |

| | | |
|---|---|---|
| | | production process: (followed from «greenish turquoise more light than "greenish turquoise"») |
| lichen-green ↓ | 2234 | 1 g of malachite + 5 ml ammonia / natural drying |
| darker lichen-green ↓ | 2235 | 1 g of malachite + 10 ml ammonia / natural drying |
| lichen-green still darker ↓ | 2236 | 1 g of malachite + 15 ml ammonia / natural drying |
| lichen-green still darker | 2237 | 1 g of malachite + 20 ml ammonia / natural drying (followed at «greenish turquoise more pronounced than "greenish turquoise"») |
| | | mineral : chrysocolla<br>rock : light greenish turquoise<br>powder : very light greenish turquoise<br>origin : Mexico |
| | | production process: 2 g of chrysocolla + 2 g of sodium carbonate: |
| medium lichen-green ↓ | 2238 | 800 °F / 1 h |
| dark lichen-green [almost black] | 2239 | 900 °F / 1 h |
| pearly green [between «lichen-green» and «olive-green»] | | |
| | 2240 | mineral : sandstone<br>rock : medium pinkish brown (light violet tone)<br>powder : medium pinkish brown (light violet tone)<br>origin : behind Percé, Gaspésie, Québec |
| | | production process: |
| light pearly green [between «lichen-green» and «olive-green» (more olive-green than lichen-green)] ↓ | 2241 | 1 g of sandstone + 2 g of sodium carbonate / 0↑1800 °F |
| light pearly green [between «lichen-green» and «olive-green» (more lichen-green than olive-green)] | 2242 | 1 g of sandstone + 3 g of potassium carbonate / 0↑1800 °F |

| green (grey tone) | | |
|---|---|---|
| pale greyish green | 2243 | mineral : gypsum<br>rock : white (yellow reflection)<br>powder : white (yellow reflection)<br>origin : Seisborough, Nova Scotia<br><br>production process:<br>(followed from «light brown»)<br>.3 g of gypsum + 50 cc of transparent polyester resin + 1% of catalyst / manual grinding / moulding / hardening (very light grey) / irradiated with electrons at 305,082 rad[354] |
| pale greyish green | 2244 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «light beige»)<br>powder finely grinded and heated 0↑1200 °F (Naples yellow): .50 g + 15 ml nitric acid / soaking: 2 d. / drying on hot plate (greenish yellow): .2 g + 50 cc of transparent polyester resin + 1% of catalyst / manual grinding / moulding / hardening (light grey) / irradiated with electrons at 305, 082 rad[354] |
| pale greyish green | 2245 | mineral : bornite<br>rock : reddish brown (with localized green and bluish green oxidation)<br>powder : reddish brown<br>origin : Lac Musset, Fosse du Labrador, Québec<br><br>production process:<br>12 g of bornite + 40 ml hydrochloric acid / soaking: 3 d. / separation of the liquid and the solid / natural drying (colour of the 1st liquid: very saturated and vivid apple-green) / addition of 100 ml hydrochloric acid to the same solid / soaking: 3 d. / drying on sand bath (colour of the 2nd liquid: vivid apple-green) / natural drying of the solid / colour of the solid |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec |

| | | |
|---|---|---|
| greyish green much more accentuated than «pale greyish green» | 2246 | production process: (followed from «greenish grey») powder finely grinded and heated 0↑1100 °F (Naples yellow [green tone]): .50 g + 15 ml nitric acid / soaking: 2 d. / drying on hot plate (light blue): .2 g + 50 cc of transparent polyester resin + 1% of catalyst / manual grinding / moulding / hardening (pale greyish green) / irradiated with electrons at 305,082 rad[354] |
| greyish green or brownish green darker than «very, very light greyish green» or «very, very light brownish green» | 2247 | mineral : gypsum<br>rock : white (yellow reflection)<br>powder : white (yellow reflection)<br>origin : Geisborough, Nova Scotia<br><br>production process: (followed from «very light greyish brown or very light brownish grey») 2 g of gypsum + 20 ml hydrochloric acid / soaking: 3 d. / drying on hot plate (chalk-white [light yellow reflection]): .3 g + 50 cc of transparent polyester resin + 1% of catalyst / manual grinding / moulding / hardening (very, very light yellow) / irradiated with electrons at 305,082 rad[354] |
| very light greyish green | 2248 | mineral : agate<br>rock : dark grass-green, slightly translucid<br>powder : light grey (light green tone)<br>origin : bank of St.-Lawrence river, region of Maria, Gaspésie, Québec<br><br>production process: 1 g of agate + 1 cc of synthetic white opaque enamel paint for the car[94] / manual grinding / application on a piece of steel sheet for the car's body measuring 1" x 1" (very, very light greyish green [almost white]) / irradiated with gamma rays at 5 Mrad (followed at «light creamy beige») |
| light greyish green | 2249 | mineral : crocidolite<br>rock : dark greyish blue<br>powder : pale greyish blue<br>origin : Griqualand district, South Africa<br><br>production process: 4 g of crocidolite + 200 ml sulphuric acid / soaking: 4 wk. / drying on hot plate (medium《unamable》 |

371

| | | |
|---|---|---|
| | | green) / irradiated with electrons at 302,831 rad[45] |
| light greyish green | 2250 | mineral : diopside<br>rock : light grey<br>powder : light beige<br>origin : Mont Orford, Québec<br><br>production process:<br>1 g of diopside + 50 ml hydrochloric acid / soaking: 2 wk. / drying on hot plate |
| light greyish green | 2251 | production process:<br>rock covered with 20 ml hydrochloric acid / soaking: 2 wk. / irradiated with gamma rays at 5.7 Mrad / drying on sand bath, completed on hot plate[362] |
| light greyish green | 2252 | mineral : olivine<br>powder : colourless (green reflection)<br>origin : Mount Haven, United States<br><br>production process:<br>powder irradiated with electrons at 302,831 rad[36] |
| light greyish green | 2253 | mineral : hornblende<br>rock : medium evergreen (light grey tone), with vitreous luster<br>powder : medium cold grey (light green tone)<br>origin : Abitibi, Québec<br><br>production process:<br>3 g of hornblende + 25 ml sulphuric acid / soaking: 24 h / drying on hot plate |
| greyish green a little more intense than «light greyish green» | 2254 | production process:<br>3 g of hornblende + 25 ml sulphuric acid / soaking: 24 h / drying on hot plate (light greyish green) / irradiated with electrons at 302,831 rad[45] |
| greyish green much more accentuated than «light greyish green» | 2255 | production process:<br>3 g of hornblende + 25 ml sulphuric acid / soaking: 24 h / drying on hot plate (light greyish green) / irradiated with gamma rays at 64.7 Mrad (followed at «light grass-green [light beige tone]») |
| | | mineral : actinolite<br>rock : cold and light evergreen<br>powder : light grey (light green tone)<br>origin : erratic bloc found at Saint-Philémon, near Dorchester, Québec |

372

| | | |
|---|---|---|
| greyish green | 2256 | production process:<br>powder irradiated with gamma rays at 64.7 Mrad[363]<br>(followed at «brownish green darker than "light brown green"») |
| | | mineral : copper<br>rock : reddish brown, with metalic luster<br>powder : reddish brown, with metalic luster<br>origin : unknown<br><br>production process:<br>(followed from «greenish turquoise»)<br>100 g of copper + 100 ml nitric acid / soaking: 5 mo. / natural drying (light bluish turquoise): |
| greyish green<br>↓ | 2257 | 0↑400 °F |
| darker greyish green | 2258 | 0↑450 °F<br>(followed at «grey [light green tone]») |
| | | mineral : fluorine<br>rock : very light fluor-green (cold mint-green type), translucid<br>powder : very light grey<br>origin : Rogers Mine, Madoc, Ontario<br><br>production process:<br>(followed from «bluish grey»)<br>1 g of fluorine + 1 cc of transparent synthetic paint for the car[94] / manual grinding / application on a piece of steel sheet for the car's body measuring 1" x 1" (light yellowish beige) / irradiated with gamma rays[351,352] at: |
| greyish green<br>↓ | 2259 | 5 Mrad |
| more intense greyish green | 2260 | 10 Mrad<br>(followed at «medium iron-grey [very light blue reflection]») |
| | | mineral : clay<br>block : pale greyish green<br>powder : pale greyish green<br>origin : bank of St.-Lawrence river at the back of the Miguasha Museum, Gaspésie Québec<br><br>production process:<br>bloc irradiated with gamma rays at: |
| greyish green | 2261 | 5 Mrad |
| \| | 2262 | 10 Mrad |

| | | |
|---|---|---|
| ↓ which | 2263 | 57.4 Mrad |
| | 2264 | 64.7 Mrad |
| | 2265 | 65.704 Mrad |
| darkens | 2266 | 102.4 Mrad |
| progressively | 2267 | 124.704 Mrad |
| | 2268 | 148.4 Mrad |
| | 2269 | 201.6 Mrad |
| | 2270 | 247.6 Mrad |
| | 2271 | 287.3 Mrad |
| | 2272 | 360 Mrad |
| | 2273 | 424.7 Mrad |
| ↓ | 2274 | 484.704 Mrad[365] |
| greyish green darker than «greyish green» | 2275 | mineral : dolomite<br>rock : white (yellow localized reflection), crystalline and translucid<br>powder : white<br>origin : Bristol district, Pontiac county, Québec<br><br>production process:<br>(followed from «light greyish brown»)<br>.3 g of dolomite + 50 cc of transparent polyester resin + 1% of catalyst / manual grinding / moulding / hardening (very, very light greenish grey) / irradiated with electrons at 305,082 rad[354] |
| greyish green [between «medium greyish green» and «dark greyish green»] | 2276 | mineral : beryl<br>rock : very light yellowish green, slightly translucid<br>powder : white (green reflection)<br>origin : Lacorne district, Abitibi, Québec<br><br>production process:<br>(followed from «apple-green»)<br>2 g of beryl + 2 g of sodium carbonate / 0↑1700 °F ↑1 h at 1700 °F (pale apple-green) / irradiated with gamma rays at 423.88 Mrad |
| | | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>(followed from «bluish green darker than "light bluish green"») |

| | | |
|---|---|---|
| dark greyish green | 2277 | 2 g of analcime + 2 g of sodium carbonate / 0↑1700 °F + 1 h at 1700 °F (followed at «bluish violet [red tone]») |
| dark green (grey tone) | 2278 | <u>production process:</u> (followed from «bluish green») 2 g of analcime + 2 g of sodium carbonate / 0↑1700 °F (followed at «bluish violet [red tone]») |
| dark greyish green | 2279 | mineral : bloody agate<br>rock : dark grass-green, slightly translucid<br>powder : light grey (light green tone)<br>origin : India<br><br><u>production process:</u><br>(followed at «medium green [orange tone]»)<br>1 g of agate + 1 cc of transparent synthetic enamel paint for the car[94] / manual grinding / application on a piece of steel sheet for the car's body measuring 1" x 1" (greenish grey) / irradiated with gamma rays at 360 Mrad |
| dark greyish green | 2280 | mineral : orthoclase<br>rock : light pinkish beige<br>powder : very light beige<br>origin : mine near Buckingham, Papineau county, Québec<br><br><u>production process:</u><br>(followed from «mixture of particles: green / bluish grey»)<br>2 g of orthoclase + 2 g of sodium carbonate / 0↑1900 °F + 1 h at 1900 °F (bluish green) / irradiated with electrons at 302,831 rad[45] |
| mixture of particles | | |
| very pale greyish green / white | 2281 | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br><u>production process:</u><br>4 g of pyrrhotite + 50 ml nitric acid / soaking: 2 wk. / separation of the liquid and the solid / natural drying (colour of the solid: mixture of particles: white / greenish grey) / irradiated with gamma rays at 70.4 Mrad[84]<br>(followed at «medium beige [light orange pink tone]») |

| | | |
|---|---|---|
| pale mossy greyish green / light beige / dark iron-grey / white | 2282 | mineral : chromite<br>rock : blackish grey<br>powder : medium brownish grey<br>origin : Black Lake, near Thetford Mines, Québec<br><br>production process:<br>(followed from «dark iron-grey»)<br>0↑1900 °F (medium chocolate-brown): 1 g + 50 ml sulphuric acid / soaking: 2 wk. / drying on hot plate (profound green) / irradiated with gamma rays at 424.7 Mrad |
| greyish green / brown | 2283 | mineral : obsidian<br>rock : very dark smok y grey, almost black<br>powder : light grey<br>origin : Arkansas, United States<br><br>production process:<br>(followed from «medium brownish grey»)<br>2 g of obsidian + 2 g of sodium carbonate / 0↑1500 °F + 45 min. at 1500 °F<br>(followed at «mixture of particles: green / orange») |
| greyish green (yellow tone) | | |
| greyish green (light yellow reflection) much more pale than «pale greyish green (yellow tone)» | 2284 | mineral : clay<br>block : pale greyish green<br>powder : pale greyish green<br>origin : bank of St.-Lawrence river at the back of the Miguasha Museum, Gaspésie, Québec<br><br>production process:<br>powder irradiated with electrons at 302,831 rad[36] |
| greyish green (yellow reflec- | 2285 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>(followed from «light greyish beige»)<br>.2 g of fluorine + 50 cc of transparent polyester resin + 1% of catalyst / manual grinding / moul- |

| | | |
|---|---|---|
| tion) | | ding / hardening (greenish grey) / irradiated with electrons at 305,082 rad[354] |
| intense greyish green (yellow reflection) | 2286 | mineral : clay<br>block : pale greyish green<br>powder : pale greyish green<br>origin : bank of St.-Lawrence river at the back of the Miguasha Museum, Gaspésie, Québec<br><br>production process:<br>powder irradiated with gamma rays at 64.7 Mrad (followed at «medium beige [grey and green tones]») |
| greyish green (orange tone) | | |
| pale greyish green (orange tone) | 2287 | mineral : bornite<br>rock : reddish brown (with localized green and bluish green oxidation)<br>powder : reddish brown<br>origin : Lac Musset, Fosse du Labrador, Québec<br><br>production process:<br>(followed from «medium and mat greenish turquoise»)<br>12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath / colour of the solid[361] |
| greyish green (brown tone) | | |
| greyish green (brown reflection) more pale than «medium greyish green (brown tone)» | 2288 | mineral : crocidolite<br>rock : dark greyish blue<br>powder : pale greyish blue<br>origin : Griqualand district, South Africa<br><br>production process:<br>(followed from «unamable medium green»)<br>4 g of crocidolite + 200 ml sulphuric acid / soaking: 4 wk. / drying on hot plate (unamable medium green) / irradiated with gamma rays at 550.22 Mrad[364] |
| blackish green | | |
| | | mineral : amethyst |

| | | |
|---|---|---|
| blackish green | 2289 | rock : violet, translucid<br>powder : light grey (lilac tone)<br>origin : Thunderbay, Ontario<br><br>production process:<br>(followed from «dark greenish blue»)<br>2 g of amethyst + 2 g of sodium carbonate / 0↑1800 °F + 1 h at 1800 °F (azure-blue) / irradiated with gamma rays at 424.7 Mrad |
| blackish green | 2290 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>1 g of goethite + 2 g of sodium carbonate + 1 g of sulphur / 1600 °F / 1 h[366] |
| blackish green | 2291 | production process:<br>(followed from «metallic grey [brown tone]»)<br>1 g of goethite + 3 g of sodium carbonate + 1 g of sulphur / 1600 °F / 1 h |
| ↓ blackish green | 2292 | 1 g of goethite + 3 g of sodium carbonate + 1 g of sulphur / 1700 °F / 1 h |
| ↓ blackish green | 2293 | 1 g of goethite + 4 g of sodium carbonate + 1 g of sulphur / 1600 °F / 1 h |
| ↓ blackish green | 2294 | 2 g of goethite + 1 g of sodium carbonate + 1 g of sulphur[929] / 1600 °F / 1 h<br>(followed at «blackish brown») |
| blackish green | 2295 | production process:<br>1 g of goethite + 3 g of sodium carbonate + 1 g of sulphur / 0↑1600 °F |
| ↓ blackish green | 2296 | 1 g of goethite + 4 g of sodium carbonate + 1 g of sulphur / 0↑1600 °F |
| blackish green | 2297 | production process:<br>1 g of goethite + 1 g of sodium carbonate + 1 g of sulphur / 1600 °F / 1 h |
| ↓ blackish green | 2298 | 1 g of goethite + 1 g of sodium carbonate + 1 g of sulphur / 1700 °F / 1 h<br>(followed at «dark greyish brown») |

378

| | | |
|---|---|---|
| blackish green | 2299 | production process:<br>(followed from «very dark chocolate-brown, almost black»)<br>3 g of goethite + 3 g of sodium carbonate + 1 g of sulphur / 1700 °F / 1 h |
| blackish green<br>↓<br>blackish green | 2300<br><br>2301 | production process:<br>(followed from «soot-black [light green tone]»)<br>1 g of goethite + 2 g of sodium carbonate + 1 g of sulphur:<br>0↑1600 °F<br><br>0↑1700 °F<br>(followed at «metallic grey [brown tone]») |
| blackish green | 2302 | production process:<br>(followed from «intense mossy olive-green»)<br>1 g of goethite + 1 g of sulphur / 0↑1700 °F / cooling: 1 g + 1 g of sodium carbonate / 0↑1700 °F[366a,b] |
| blackish green | 2303 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «bluish green more intense than "intense bluish green"»)<br>2 g of molybdenite + 2 g of sodium carbonate / 1500 °F / 45 min. (intense bluish green) / irradiated with gamma rays at 424.7 Mrad |
| intense blackish green | 2304 | mineral : coal<br>rock : black<br>powder : brownish black<br>origin : bank of St.-Lawrence river, city of Québec, Québec<br><br>production process:<br>(followed from «mint-green [malachite-green type]»)<br>2 g of coal + 2 g of sodium carbonate / 0↑1500 °F + 1 h at 1500 °F<br>(followed at «brown») |
| blackish green (brown tone) | | |
| | | mineral : fluorine<br>rock : very light and luminous evergreen, translucid<br>powder : very light grey |

| | | |
|---|---|---|
| | | origin : Poudrette quarry, Mont Saint-Hilaire, Québec<br><br>production process:<br>(followed from «grass-green darker than "dark grass-green"») |
| blackish green (brown tone) | 2305 | rock irradiated with gamma rays at 424.7 Mrad |
| blackish green (grey tone) | | |
| | | mineral : sodalite<br>rock : indigo-blue, slightly translucid<br>powder : light grey (light blue tone)<br>origin : possibly Africa<br><br>production process:<br>1 g of sodalite + 1 cc of transparent synthetic enamel paint for the car[94] / manual grinding / application on a piece of steel sheet used for the car's body, measuring 1" x 1" (dark green [light grey tone]) / irradiated with gamma rays[351,352] at: |
| blackish green (light grey tone)<br>↓ | 2306 | 10 Mrad |
| blackish green (grey tone) still a little darker | 2307 | 57.4 Mrad<br>(followed at «dark chocolate-brown [green tone]») |

GREEN (YELLOW TONE)

| colour obtained | number | mineral / production process |
|---|---|---|
| olive-green | | |
| pale olive-green | 2308 | mineral : bloody agate<br>rock : dark grass-green, slightly translucid<br>powder : light grey (light green tone)<br>origin : India<br><br>production process:<br>8 g of agate + 40 ml nitric acid / soaking: 1 wk. / separation of the liquid and the solid / natural drying (colour of the liquid: vivid emerald-green) / irradiated with electrons at 305,200 rad[73] |
| pale olive-green | 2309 | mineral : labrador<br>rock : blackish grey<br>powder : medium grey<br>origin : Lac Saint-Jean, Québec<br><br>production process:<br>2 g of labrador + 2 g of sodium carbonate / 0↑1600 °F + 30 min. at 1600 °F (light olive-green) / irradiated with electrons at 162,431 rad |
| olive-green more light than «light olive-green» | 2310 | mineral : andulusite<br>rock : light brownish grey<br>powder : light grey<br>origin : Bimbowrie, Southern Australia<br><br>production process:<br>4 g of andulusite + 80 ml hydrochloric acid / soaking: 2 wk. / separation of the liquid and the solid / drying on hot plate (colour of the solid: light olive-green) / irradiated with gamma rays at 70.4 Mrad<br>(followed at «dark greyish beige [green reflection]») |
| | | mineral : analcime<br>rock : white (grey reflection), crystalline and translucid<br>powder : light grey<br>origin : De-Mix quarry, North side of Mont Saint-Hilaire, Rouville county, Québec |

| | | |
|---|---|---|
| light olive-green | 2311 | <u>production process:</u><br>0↑2000 °F (very light grey, cristalline and trans-lucid) / powder irradiated with gamma rays at 64.7 Mrad[368]<br>(followed at «medium olive-green») |
| light olive-green | 2312 | mineral : anorthosite<br>rock : dark grey<br>powder : medium grey<br>origin : Jonquière, Lac Saint-Jean, Québec<br><br><u>production process:</u><br>2 g of anorthosite + 2 g of sodium carbonate / 0↑1700 °F + 1 h at 1700 °F (olive-green) / irra-diated with electrons at 162,431 rad |
| light olive-green | 2313 | mineral : beryl<br>rock : intense grass-green, slightly translucid<br>powder : greenish grey<br>origin : unknown<br><br><u>production process:</u><br>3 g of beryl + 40 ml nitric acid / soaking: 1 wk. / separation of the liquid and the solid / natural drying (colour of the liquid: pale apple-green crystals with a fine lemon-yellow powder) / ir-radiated with electrons at 305,200 rad[46] |
| light olive-green | 2314 | mineral : bornite<br>rock : reddish brown (with localized green and bluish green oxidation)<br>powder : reddish brown<br>origin : Lac Musset, Fosse du Labrador, Québec<br><br><u>production process:</u><br>1500 °F / 1 h (medium reddish brown): 1 g + 40 ml hydrochloric acid / soaking: 14 d. / separation of the liquid and the solid / natural drying (colour of the liquid: pastel greenish blue crystals on a layer of pale phtalo-green[217a] powder ) / irradiated with electrons at 164,800 rad<br>(followed at «dark olive-green») |
| light and intense | 2315 | mineral : anorthosite<br>rock : dark grey<br>powder : medium grey<br>origin : Jonquière, Lac Saint-Jean, Québec<br><br><u>production process:</u><br>6 g of anorthosite + 50 ml hydrochloric acid / |

| | | |
|---|---|---|
| olive-green | | soaking: 2 wk. / drying on hot plate |
| | | mineral : labrador<br>rock : blackish grey<br>powder : medium grey<br>origin : Lac Saint-Jean, Québec |
| | | production process:<br>(followed from «green more accentuated than "light green"»)<br>2 g of labrador + 2 g of sodium carbonate: |
| light olive-green<br>↓ | 2316 | 0↑1600 °F + 30 min. at 1600 °F |
| accentuated olive-green | 2317 | 0↑1600 °F + 1 h at 1600 °F<br>(followed at «olive-green [yellow tone]») |
| | | mineral : andulusite<br>rock : light brownish grey<br>powder : light grey<br>origin : Bimbowrie, Southern Australia |
| | | production process:<br>4 g of andulusite + 80 ml hydrochloric acid / soaking: 2 wk. / separation of the liquid and the solid / drying on hot plate: |
| light olive-green<br>↓ | 2318 | colour of the solid |
| olive-green more intense than «light olive-green» | 2319 | colour of the liquid |
| | | mineral : cement[82]<br>powder : medium cold grey<br>origin : Union des Carrières, Limoilou, Québec |
| | | mineral : chrome<br>powder : light grey, with metallic brilliance |
| | | production process:<br>(followed from «grass-green more accentuated than "grass-green [accentuated green tone]"») |
| light olive-green<br>↓ | 2320 | 1.50 g of cement + .15 g of chrome / 1650 °F / 1 h<br>(followed at «medium grass-green»)<br>(followed from «medium grass-green») |
| light olive-green | 2321 | 1.50 g of cement + 1.50 g of chrome / 1675 °F / 1 h<br>(followed at «intense grass-green») |

| | | |
|---|---|---|
| olive-green more accentuated than «light olive-green» | 2322 | mineral : beryl<br>rock : very light greenish blue, slightly translucid<br>origin : Brassard d istrict, Berthier county, Québec<br><br>production process:<br>(followed from «light green»)<br>rock irradiated with gamma rays at 242.804 Mrad[122]<br><br>(followed at «yellow [green tone]») |
| | | mineral : ochre[128]<br>powder : black<br>origin : Red Mill, in the suburbs of Cap-de-la-Madeleine, Québec<br><br>production process:<br>1 g of ochre + 2 g of potassium carbonate: |
| vivid and light olive-green ↓ | 2324 | 0↑1500 °F |
| olive-green still more vivid and light ↓ | 2325 | 0↑1600 °F |
| olive-green still more intense ↓ | 2326 | 0↑1700 °F |
| darker olive-green | 2327 | 0↑1850 °F |
| olive-green | 2328 | mineral : Gaspé agate<br>rock : marbled nodule with shaded tints of white, pink and grey, slightly translucid<br>powder : very light pinkish grey<br>origin : Mont Lyall, Gaspésie, Québec<br><br>production process:<br>4 g of agate + 40 ml nitric acid / soaking: 1 wk. / separation of the liquid and the solid / natural drying (colour of the liquid: fairly vivid greenish turquoise [with a few olive-green particles]) / irradiated with gamma rays at 64.7 Mrad<br><br>(followed at «mixture of particles: beige / brown») |

| | | |
|---|---|---|
| olive-green | 2329 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>3 g of apatite + 20 ml hydrochloric acid / soaking: 3 d. / drying on hot plate (very light yellow): .30 g + 50 cc of transparent polyester resin + 1% of catalyst / manual grinding / moulding / hardening (light, cold and fairly vivid mint-green) / irradiated with gamma rays at 11.4 Mrad |
| green (olive-green type) | 2330 | mineral : crocidolite<br>rock : dark greyish blue<br>powder : pale greyish blue<br>origin : Griqualand district, South Africa<br><br>production process:<br>4 g of crocidolite + 100 ml hydrochloric acid / soaking: 2 wk. / drying on hot plate |
| olive-green | 2331 | production process:<br>250 g of crocidolite + 1650 ml hydrochloric acid in a becher of 2000 ml or crocidolite entirely covered with hydrochloric acid in a vertical container / soaking: 1 wk. / drying on hot plate (formation of 2 layers of superposed colours, the one at the bottom being: dark green [light yellow tone]) / irradiated with electrons at 162,431 rad |
| olive-green | 2332 | mineral : anorthosite<br>rock : dark grey<br>powder : medium grey<br>origin : Jonquière, Lac Saint-Jean, Québec<br><br>production process:<br>(followed from «intense mint-green»)<br>2 g of anorthosite + 2 g of sodium carbonate / 0↑1700 °F + 1 h at 1700 °F<br>(followed at «powerful grass-green») |
| | | mineral : beryl<br>rock : light blue, slightly translucid<br>powder : light grey<br>origin : Abitibi, Québec |

| | | |
|---|---|---|
| olive-green | 2333 | production process:<br>(followed from «light green»)<br>rock irradiated with gamma rays at 242.804 Mrad[369]<br>(followed at «pale brown [light green tone]») |
| olive-green | 2334 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 20 ml hydrochloric acid + 5 ml nitric acid / soaking: 6 d. / separation of the liquid and the solid / natural drying (colour of the liquid: light emerald-green[24]) / irradiated with electrons at 164,800 rad<br>(followed at «apple-green») |
| olive-green | 2335 | mineral : calcite[11,318,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>1.50 g of calcite + .50 g of chrome / 1900 °F (grass-green [blue tone] darker than «grass-green [blue tone]»): .25 g + 20 ml sulphuric acid / soaking: 3 d. / drying on hot plate |
| olive-green | 2336 | mineral : chromite<br>rock : blackish grey<br>powder : medium brownish grey<br>origin : Black Lake, near Thetford Mines, Québec<br><br>production process:<br>4 g of chromite + 80 ml sulphuric acid / soaking: 2 wk. / drying on hot plate (intense mint-green [malachite-green type]) / irradiated with electrons at 162,431 rad |
| | | mineral : cement[82]<br>powder : medium cold grey<br>origin : Union des Carrières, Limoilou, Québec |

| | | |
|---|---|---|
| olive-green | 2337 | mineral : chrome<br>powder : light grey, with metallic brilliance<br><br><u>production process:</u><br>(followed from «grass-green more acute than "intense grass-green"» and «medium olive-green»)<br>1.50 g of cement + .50 g of chrome / 1900 °F / 1 h<br>(followed at «brownish green») |
| mat olive-green | 2338 | mineral : cement[269]<br>powder : medium brownish grey<br>origin : CALCO, Charlesbourg, Québec<br><br>mineral : chrome<br>powder : light grey, with metallic brilliance<br><br><u>production process:</u><br>(followed from «grass-green a little more accentuated than "light grass-green"»)<br>1.50 g of cement + .25 g of chrome / 1525 °F / 1 h<br>(light grass-green) / irradiated with gamma rays at 424.7 Mrad[239] |
| olive-green | 2339 | mineral : copper concentrate (Cu-FeS)<br>powder : medium chocolate-brown (grey tone)<br>origin : Centre de recherche des Mines Noranda in Montréal, Québec<br><br><u>production process:</u><br>4 g of concentrate + 50 ml nitric acid / soaking: 2 h / separation of the liquid and the solid in 6 parts: a) pure liquid: natural drying; b) pure liquid: drying on sand bath; c) liquid + a little bit of solid: natural drying; d) pure solid: natural drying; e) pure solid: drying on sand bath; f) solid coming from c): natural drying<br>/ colour of d)[370] pure solid: natural drying |
| olive-green<br>↓<br>lighter olive-green | 2340<br><br>2341 | mineral : dolomite<br>rock : light grey<br>powder : light grey<br>origin : Shefferville, Ungava, Québec<br><br><u>production process:</u><br>(followed from «mixture of particles: olive-green / beige»)<br>2 g of dolomite + 2 g of sodium carbonate:<br>0↑1800 °F + 1 h at 1800 °F<br><br>0↑1900 °F + 1 h at 1900 °F |

| | | |
|---|---|---|
| | | mineral : galena<br>rock : dark grey, with metallic brilliance<br>powder : dark grey, with metallic brilliance<br>origin : Trail, British Columbia<br><br>production process:<br>4 g of galena powder deposited on a piece of stainless steel measuring 1" x 1": |
| green (olive-green type) | 2342 | 1400 °F / 3 min. / immediate removal[280] |
| ↓ | | |
| green (olive-green type) | 2343 | 1400 °F / 6 min. / immediate removal[280]<br>(followed at «dark green / brown») |
| | | mineral : sandstone<br>rock : medium pinkish brown (light violet tone)<br>powder : medium pinkish brown (light violet tone)<br>origin : behind Percé, Gaspésie, Québec<br><br>production process:<br>(followed from «orange»)<br>2 g of sandstone + 2 g of sodium carbonate: |
| olive-green | 2344 | 0↑1700 °F + 1 h at 1700 °F |
| ↓ | | |
| olive-green | 2345 | 0↑1800 °F + 1 h at 1800 °F<br>(followed at «caramel-brown [grey and green tones]») |
| | | mineral : hypersthene<br>rock : black<br>powder : medium brownish grey<br>origin : Lac Saint-Jean, Québec<br><br>production process:<br>(followed from «mixture of particles: olive-green / brown») |
| olive-green | 2346 | 2 g of hypersthene + 2 g of sodium carbonate /<br>0↑1700 °F + 1 h at 1700 °F<br>(followed at «green [grass-green type]») |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «medium beige») |
| olive-green | 2347 | 2 g of molybdenite + 2 g of sodium carbonate /<br>0↑1600 °F + 1 h at 1600 °F<br>(followed at «green [between "olive-green" and "phtalo-green"[217a]]») |

| | | |
|---|---|---|
| olive-green | 2348 | production process:<br>2 g of molybdenite + 2 g of potassium carbonate / 0↑1600 °F[371]<br>(followed at «green [between "olive-green" and "phtalo-green"[217a]]») |
| | 2349 | mineral : PbO<br>powder : yellow (light orange tone)<br><br>production process:<br>(followed from «orange-yellow [brown tone]») |
| olive-green | 2350 | irradiated with gamma rays at 148.4 Mrad<br>(followed at «olive-green [accentuated green and brown tones]») |
| | | mineral : uraninite<br>rock : medium chocolate-brown (red Bordeau tone)<br>powder : medium milky chocolate-brown<br>origin : Yellowknife, Canada<br><br>production process:<br>(followed from «brown [accentuated green tone]»)<br>2 g of uraninite + 2 g of potassium carbonate: |
| olive-green<br>↓ | 2351 | 0↑1700 °F |
| dark and more accentuated olive-green<br>↓ | 2352 | 0↑1800 °F |
| olive-green still a little darker and more accentuated | 2353 | 0↑1900 °F |
| | | production process:<br>(followed from «mixture of particles: olive-green / light brown [orange tone]»)<br>2 g of uraninite + 2 g of sodium carbonate: |
| olive-green<br>↓ | 2354 | 0↑1500 °F + 45 min. at 1500 °F |
| olive-green darker and more accentuated<br>↓ | 2355 | 0↑1500 °F + 1 h at 1500 °F |
| olive-green still darker and more accentuated<br>↓ | 2356 | 0↑1600 °F + 1 h at 1600 °F |
| olive-green still darker and more accentuated<br>↓ | 2357 | 0↑1700 °F + 1 h at 1700 °F |
| olive-green still | 2358 | 0↑1800 °F + 1 h at 1800 °F |

| | | |
|---|---|---|
| darker and more accentuated<br>↓<br>olive-green still darker and more accentuated | 2359 | (followed at «olive-green [beneath]»)<br><br>0↑1900 °F + 1 h at 1900 °F |
| olive-green | 2360 | production process:<br>(followed from «olive-green darker and more accentuated than "olive-green"» [above])<br>1 g of uraninite + 2 g of potassium carbonate / 0↑1800 °F[373] |
| olive-green | 2361 | mineral : shale (formation of Sillery[359])<br>rock : brownish red<br>powder : pinkish brown, mat<br>origin : bank of St.-Lawrence river, at Berthier-Sur-Mer at the rear of the Dénechaud manor, Québec<br><br>production process:<br>(followed from «khaki-beige [green tone]»)<br>0↑1300 °F (brick-orange): 3 g + 25 ml hydrochloric acid / soaking: 4-5 d. / drying on hot plate (followed at «vivid orange») |
| olive-green more accentuated than «olive-green» | 2361.a | vegetable : chlorophyll<br>powder : olive green<br><br>production process:<br>irradiated with gamma rays at 2.26 Mrad |
| | | mineral : graphite<br>rock : dark grey, with metallic brilliance<br>powder : dark grey, with metallic brilliance<br>origin : Grenville, Québec<br><br>production process:<br>1% of graphite is mixed with molten glass and the entity is melted at 2,400 °F (dark colour [between «apple-green» and «olive-green»]) / irradiated with gamma rays at: |
| olive-green a bit darker than «olive-green»<br>↓ | 2361.1 | 2.47 Mrad |
| olive-green still darker<br>↓ | 2361.2 | 4.94 Mrad |
| olive-green still | 2361.3 | 7.41 Mrad |

390

| | | |
|---|---|---|
| a little darker | | (followed at «olive-green [light amber tone]») |
| medium olive-green | 2362 | mineral : bloody agate<br>rock : dark grass-green, slightly translucid<br>powder : light grey (light green tone)<br>origin : India<br><br>production process:<br>8 g of agate + 40 ml hydrochloric acid / soaking: 1 wk. / separation of the liquid and the solid / natural drying / colour of the liquid[183] |
| medium olive-green | 2363 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>(followed from «light olive-green», «brownish grey darker than "very light brownish grey"» and «medium brownish grey»)<br>0↑2000 °F (very light grey [crystalline and translucid]) / powder irradiated with gamma rays at 424.7 Mrad[374] |
| medium olive-green | 2364 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 25 ml nitric acid / soaking: 6 d. / separation of the liquid and the solid / natural drying (colour of the solid: mossy green) / irradiated with electrons at 305,200 rad[46] |
| medium and intense green [olive- | 2365 | mineral : chrysocolla<br>rock : light greenish turquoise<br>powder : very light greenish turquoise<br>origin : Mexico<br><br>production process:<br>(followed from «green a little more accentuated than "light green"»)<br>5 g of chrysocolla + 25 ml ammonia / natural drying (light bluish green) / irradiated with gamma |

| | | |
|---|---|---|
| green type) | | rays at 424.7 Mrad |
| medium olive-green | 2366 | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «medium grass-green»)<br>1.50 g of cement + .50 g of chrome / 1850 °F / 1 h<br>(followed at «olive-green») |
| medium olive-green | 2367 | mineral : silica[91]<br>powder : very light grey, crystalline<br>origin : mine exploited by Développement Gex Inc. of Montréal for SKW Bécancour. Lac La Galette, Charlevoix county, 30 miles at the North of Saint-Urbain, Québec<br><br>production process:<br>(followed from «light greyish brown»)<br>2 g of silica + 2 g of sodium carbonate / 0↑1800 °F + 1 h at 1800 °F (apple-green a bit darker than «light apple-green») / irradiated with gamma rays at 423.88 Mrad |
| medium olive-green | 2368 | mineral : quartz<br>rock : light pink, translucid<br>powder : very light grey<br>origin : unknown<br><br>production process:<br>4 g of quartz + 40 ml nitric acid / soaking: 1 wk. / separation of the liquid and the solid / natural drying / colour of the liquid[140] |
| | | mineral : asbestos[4]<br>rock : dark grey (green reflection)<br>powder : light grey (green reflection)<br>origin : Asbestos Corporation Ltd., Thetford Mines, Québec<br><br>mineral : malachite<br>rock : ribboned variety of accentuated mint-green<br>powder : light and brilliant mint-green<br>origin : Katanga province, at 300 km from Lubumbachai, Zaïr, Africa |

| | | |
|---|---|---|
| olive-green a bit more pale than «medium olive-green» | 2368.1 | production process: the asbestos is heated 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 1 g + 0.28122 g of malachite + 0.14061 g of MgO / grinding |
| olive-green a bit more pale than «medium olive-green» | 2368.2 | production process: the asbestos is heated 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 1 g + 0.28122 g of malachite + 0.28122 g of potassium carbonate / grinding |
| medium olive-green | 2368.3 | production process: the asbestos is heated 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 1 g + 0.28122 g of malachite / grinding |
| | | mineral : ochre[111]<br>powder : dark reddish brown<br>origin : Red Mill, in the suburbs of Cap-de-la-Madeleine, Québec<br><br>production process:<br>(followed from «brown [red tone with violet reflection]»)<br>2 g of ochre + 2 g of potassium carbonate: |
| medium and vivid olive-green | 2369 | 0↑1600 °F |
| ↓ | | |
| more intense olive-green | 2370 | 0↑1700 °F |
| ↓ | | |
| darker olive-green | 2371 | 0↑1750 °F |
| | | mineral : crocidolite<br>rock : dark greyish blue<br>powder : pale greyish blue<br>origin : Griqualand district, South Africa |

393

| | | |
|---|---|---|
| olive-green more intense and accentuated than «olive-green» | 2372 | production process:<br>4 g of crocidolite + 100 ml hydrochloric acid / soaking: 2 wk. / drying on hot plate (green [olive-green style]) / irradiated with gamma rays at 190.22 Mrad<br>(followed at «dark evergreen») |
| intense olive-green | 2373 | mineral : chalcocite<br>rock : dark iron-grey (with localized turquoise oxidation)<br>powder : dark iron-grey<br>origin : Butte, Montana, United States<br><br>production process:<br>(followed from «light and intense mint-green»)<br>4 g of chalcocite + 100 ml sulphuric acid / soaking: 2 wk. / separation of the liquid and the solid / drying on hot plate / colour of the solid[369] |
| intense olive-green | 2374 | mineral : bauxite[92]<br>powder : pinkish beige, mat<br>origin : Alcan Company, French Guyana<br><br>production process:<br>30 g of bauxite + 100 ml hydrochloric acid / soaking: 24 h / drying in oven at 130 °C |
| pronounced olive-green | 2375 | production process:<br>(followed from «olive-green [yellow tone]»)<br>3 g of bauxite + 20 ml hydrochloric acid + 5 ml water / soaking: 4-5 d. / drying on hot plate<br>(followed at «greenish beige») |
| vivid olive-green | 2376 | mineral : beryl<br>rock : intense grass-green, slightly translucid<br>powder : greenish grey<br>origin : unknown<br><br>production process:<br>3 g of beryl + 40 ml hydrochloric acid / soaking: 1 wk. / separation of the liquid and the solid / natural drying / colour of the liquid[183] |
| olive-green more intense than «intense olive-green» | 2377 | production process:<br>3 g of beryl + 40 ml hydrochloric acid / soaking: 1 wk. / separation of the liquid and the solid / natural drying (colour of the liquid: vivid olive-green) / irradiated with electrons at 305,200 rad[73] |

394

| | | |
|---|---|---|
| vivid olive-green | 2378 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «dark grey»)<br>1 g of calcite + 1 g of chrome + 1 g of SiC / 1700 °F / 1 h (pale grass-green [grey tone]) / cooling / 1800 °F / 15 h and 30 min.<br>(followed at «dark grass-green» and «grass-green a bit darker and less green than "vivid grass-green"») |
| intense olive-green | 2379 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml nitric acid / soaking: 2 wk. / separation of the liquid (1st) and the solid / desiccation of the 1st liquid (colour of the 1st liquid: very intense emerald-green) / addition to the same solid of 100 ml nitric acid / soaking: 2 wk. / separation of the liquid (2nd) and the solid / desiccation of the 2nd liquid (mixture of particles: acute greenish turquoise / very vivid blue) / natural drying of the solid (colour of the solid: intense green [between «grass-green» and «Paris green »]) / the 2nd liquid is irradiated with gamma rays at 64.7 Mrad<br>(followed at «medium and intense apple-green») |
| pronounced olive-green | 2380 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «brown»)<br>0↑2300 °F (medium chocolate-brown): 3 g + 20 ml hydrochloric acid / soaking: 3 d. / drying on hot plate |

395

| | | |
|---|---|---|
| | | mineral : shale (formation of Sillery[359])<br>rock : brownish red<br>powder : pinkish brown, mat<br>origin : bank of St.-Lawrence river, at Berthier-Sur-Mer at the rear of the Dénechaud manor, Québec |
| pronounced olive-green | 2381 | production process:<br>15 g of shale + 100 ml hydrochloric acid / soaking: 24 h / drying on hot plate |
| pronounced olive-green | 2382 | production process:<br>15 g of shale + 100 ml hydrochloric acid / soaking: 1 wk. / drying on hot plate |
| pronounced olive-green | 2383 | production process:<br>15 g of shale + 100 hydrochloric acid / soaking: 3 mo. / drying on hot plate[375] |
| pronounced olive-green | 2384 | production process:<br>3 g of shale + 25 ml hydrochloric acid / soaking: 3 d. / drying on hot plate |
| | | mineral : antigorite<br>rock : pale yellowish green<br>powder : very pale greenish yellow<br>origin : Canadian Refractories Mine, Kilmar, Québec |
| intense olive-green | 2385 | production process:<br>(followed from «creamy yellow [accentuated green tone]»)<br>2 g of antigorite + 2 g of sodium carbonate / 0↑1500 °F + 1 h at 1500 °F<br>(followed at «light mint green») |
| | | mineral : epidote<br>rock : green (light brown tone [olive-green type])<br>powder : grey (greenish brown tone)<br>origin : Deloro Road, Madoc, Ontario |
| olive-green a bit darker and accentuated than «olive-green» | 2386 | production process:<br>5 Mrad |
| ↓ | | |
| olive-green still a bit darker | 2387 | 10 Mrad |

| | | |
|---|---|---|
| ↓<br>olive-green still a bit darker | 2388 | 57.4 Mrad |
| ↓<br>olive-green still a bit darker | 2389 | 64.7 Mrad<br>(followed at «olive-green [brown tone]») |
| intense olive-green | 2390 | mineral : smaltite[25], a variety of skutterudite<br>rock : dark iron-grey, with silver metallic brilliance<br>powder : dark grey<br>origin : Cobalt, Ontario<br><br><u>production process:</u><br>0↑1900 °F (dark brown): .30 g + 50 ml hydrochloric acid / soaking: 2 wk. / separation of the liquid and the solid / drying on hot plate / colour of the solid[376] |
| very intense olive-green | 2391 | mineral : andulusite<br>rock : light brownish grey<br>powder : light grey<br>origin : Bimbowrie, Southern Australia<br><br><u>production process:</u><br>.81 g of andulusite + 1.31 g of sodium carbonate / 1700 °F / 1 h (apple-green) / irradiated with gamma rays at 65.65 Mrad<br>(followed at «blackish brown [localized olive-green reflection]») |
| very intense olive-green | 2392 | mineral : bauxite[92]<br>powder : pinkish beige, mat<br>origin : Alcan Company, French Guyana<br><br><u>production process:</u><br>40 g of bauxite + 100 ml hydrochloric acid / soaking 5 mo. / natural drying |
| olive-green a bit more intense than «very intense olive-green» | 2393 | <u>production process:</u><br>40 g of bauxite + 100 ml hydrochloric acid / soaking: 5 mo. / natural drying (very intense olive-green) / irradiated with gamma rays at:<br>64.7 Mrad[377] |
| ↓<br>olive-green still a bit more intense | 2394 | 424.7 Mrad |
| | | mineral : mussel shell or calcium carbonate |

| | | |
|---|---|---|
| olive-green darker than «intense olive-green» | 2395 | shell : dark indigo-blue (violet tone)<br>powder : white<br>origin : St.-Lawrence river, Baie-des-Chaleurs, Gaspésie, Québec<br><br>mineral : chrome<br>powder : light grey, with metallic brilliance<br><br>production process:<br>.74 g of shell powder + 1 g of chrome / 1700 °F / 1 h (vivid grass-green) / irradiated with gamma rays at 70.4 Mrad[239]<br>(followed at «dark chocolate-brown») |
| dark olive-green<br>↓<br>lighter and more vivid olive-green | 2396<br><br>2397 | mineral : chromite<br>rock : blackish grey<br>powder : medium brownish grey<br>origin : Black Lake, near Thetford Mines, Québec<br><br>production process:<br>(followed from «khaki-green»)<br>2 g of chromite + 2 g of potassium carbonate:<br>0↑1600 °F<br><br>0↑1700 °F<br>(followed at «apple-green») |
| dark olive-green | 2398 | production process:<br>(followed from «khaki-brown [or greenish brown]»)<br>2 g of chromite + 2 g of sodium carbonate / 0↑1600 °F + 1 h at 1600 °F<br>(followed at «intense yellowish green») |
| dark olive-green | 2399 | mineral : galena<br>rock : dark grey, with metallic brilliance<br>powder : dark grey, with metallic brilliance<br>origin : Trail, British Columbia<br><br>production process:<br>.45 g of galena + .45 g of sodium carbonate / deposited on a piece of glass measuring 1" x 1" x 1/8" / 0↑1700 °F / slow cooling in furnace[280]<br>(followed at «olive-green [light yellow tone], a bit lighter than "dark olive-green [yellow tone]"») |
| dark olive-green [with «metallic | 2399.1 | production process:<br>150 g of molten glass (sodalime) is collected, at the state of fusion, in a furnace (1200 °C) on a |

| | | |
|---|---|---|
| grey reflections»] | | metal rod / 2 g of galena powder is sprinkled at the surface of the glass / then, the entity is put again in the furnace and melted by the flame at 1200 °C / then, the «collect» is taken off the metal rod[280]<br>(followed at «medium olive-green [yellow tone]») |
| | | mineral : sandstone<br>rock : medium pinkish brown (light violet tone)<br>powder : medium pinkish brown (light violet tone)<br>origin : behind Percé, Gaspésie, Québec<br><br>production process: |
| dark olive-green | 2400 | 1 g of sandstone + 1 g of potassium carbonate / 0↑1800 °F |
| | | mineral : ochre[111]<br>powder : dark reddish brown<br>origin : Red Mill, in the suburbs of Cap-de-la-Madeleine, Québec<br><br>production process:<br>1 g of ochre + 2 g of potassium carbonate: |
| dark olive-green | 2401 | 0↑1600 °F |
| ↓ | | |
| more intense olive-green | 2402 | 0↑1700 °F |
| ↓ | | |
| olive-green more pale and grey | 2403 | 0↑1750 °F |
| | | mineral : peridotite<br>rock : medium grey<br>powder : medium brownish grey (green reflection)<br>origin : Thetford Mines, Québec<br><br>production process:<br>(followed from «greenish beige»)<br>2 g of peridotite + 5 g of potassium carbonate: |
| dark olive-green | 2404 | 0↑1600 °F |
| ↓ | | |
| intense olive-green | 2405 | 0↑1700 °F |
| ↓ | | |
| olive-green still more intense | 2406 | 0↑1800 °F |
| | | mineral : orpiment<br>rock : vivid yellow (orange tone)<br>powder : vivid yellow (orange tone)<br>origin : Nevada, United States |

| | | |
|---|---|---|
| olive-green a bit more pale than «dark olive-green» | 2406.1 | mineral : zirconium oxide<br>powder : light beige<br>origin : Tam Ceramic Inc., Montréal, Québec<br><br>animal : dried pork blood<br>powder : dark brown (red tone and orange reflection)<br><br>vegetable : indigo<br>powder : very dark indigo-blue<br><br>production process:<br>0.14061 g of orpiment irradiated with gamma rays at 2.26 Mrad + 0.14061 g of dried pork blood + 0.14061 g of indigo + 0.14061 g of zirconium oxide / grinding |
| olive-green a bit more pale than «dark olive-green» | 2406.2 | mineral : orpiment<br>rock : vivid yellow (orange tone)<br>powder : vivid yellow (orange tone)<br>origin : Nevada, United States<br><br>animal : dried pork blood<br>powder : dark brown (red tone and orange reflection)<br><br>vegetable : indigo<br>powder : very dark indigo-blue<br><br>production process:<br>0.14061 g of orpiment irradiated with gamma rays at 2.26 Mrad + 0.14061 g of dried pork blood + 0.14061 g of indigo + 0.28122 g of sodium carbonate / grinding |
| dark olive-green | 2406.3 | mineral : orpiment<br>rock : vivid yellow (orange tone)<br>powder : vivid yellow (orange tone)<br>origin : Nevada, United States<br><br>animal : dried pork blood<br>powder : dark brown (red tone and orange reflection)<br><br>vegetable : indigo<br>powder : very dark indigo-blue<br><br>production process:<br>0.14061 g of orpiment irradiated with gamma rays at 2.26 Mrad + 0.14061 g of dried pork blood + 0.14061 g of indigo / grinding |
| | | mineral : bloody agate<br>rock : dark grass-green, slightly translucid<br>powder : light grey (light green tone) |

| | | |
|---|---|---|
| dark olive-green | 2407 | origin : India<br><br><u>production process:</u><br>(followed from «apple-green more accentuated than "vivid apple-green"»)<br>8 g of agate + 40 ml hydrochloric acid / soaking: 1 wk. / separation of the liquid and the solid / natural drying (colour of the solid: vivid apple-green) / irradiated with electrons at 305,200 rad[73] |
| dark and intense olive-green | 2408 | mineral : agate<br>rock : dark grass-green, slightly translucid<br>powder : light grey (light green tone)<br>origin : bank of St.-Lawrence river, region of Maria, Gaspésie, Québec<br><br><u>production process:</u><br>2 g of agate + 2 g of sodium carbonate / 0↑1900 °F + 1 h at 1900 °F (emerald-green) / irradiated with gamma rays at 64.7 Mrad<br>(followed at «dark brown ochre») |
| accentuated and dark olive-green<br>↓ | 2409 | mineral : crocidolite<br>rock : dark greyish blue<br>powder : pale greyish blue<br>origin : Griqualand district, South Africa<br><br><u>production process:</u><br>250 g of crocidolite + 1650 ml hydrochloric acid in a becher of 2000 ml <u>or</u> crocidolite entirely covered with hydrochloric acid in a vertical container / soaking: 1 wk. / drying on hot plate (formation of 2 superposed layers of colours; the one at the bottom is: dark green [light yellow tone]) / irradiated with gamma rays at:<br>190.22 Mrad |
| olive-green much more vivid and pronounced | 2410 | 550.22 Mrad |
| dark olive-green | 2411 | mineral : bornite<br>rock : reddish brown (with localized green and bluish green oxidation)<br>powder : reddish brown<br>origin : Lac Musset, Fosse du Labrador, Québec<br><u>production process:</u><br>2 g of bornite + 25 ml nitric acid / soaking: 6 d. / separation of the liquid and the solid / natural |

| | | |
|---|---|---|
| | | drying (colour of the liquid: vivid and dark emerald-blue)/irradiated with electrons at 305,200 rad[46] |
| dark olive-green | 2412 | production process:<br>(followed from «light olive-green»)<br>1500 °F / 1 h (medium reddish brown): 1 g + 40 ml hydrochloric acid / soaking: 14 d. / separation of the liquid and the solid / natural drying (colour of the liquid: «pastel greenish blue» crystals on a layer of «pale phtalo[217a]-green» powder / irradiated with electrons at 305,200 rad[73] |
| intense, vivid, accentuated and dark olive-green | 2413 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml hydrochloric acid / soaking: 2 wk. / separation of the liquid and the solid / drying on hot plate (colour of the liquid: intense green [between «green» and «Paris green»]) / irradiated with gamma rays at 424.7 Mrad[81,239] |
| dark and intense olive-green<br>↓<br>black olive-green | 2414<br><br><br>2415 | mineral : ochre[128]<br>powder : black<br>origin : Red Mill, in the suburbs of Cap-de-la-Madeleine, Québec<br><br>production process:<br>2 g of ochre + 2 g of potassium carbonate:<br>0↑1600 °F<br><br>0↑1700 °F<br>(followed at «dark iron-grey») |
| | | mineral : shale (formation of Sillery[359])<br>rock : brownish red<br>powder : pinkish brown, mat<br>origin : bank of St.-Lawrence river, at Berthier-Sur-Mer at the rear of the Dénechaud manor, Québec<br><br>production process:<br>3 g of shale + 25 ml hydrochloric acid / soaking: 3 d. / drying on hot plate (pronounced olive-green) / irradiated with gamma rays at: |

| | | |
|---|---|---|
| olive-green a bit darker than «intense olive-green»<br>↓<br>dark and intense olive-green | 2416<br><br><br><br><br>2417 | 64.7 Mrad<br><br><br><br><br>424.7 Mrad |
| dark olive-green | 2418 | mineral : serpentine<br>rock : yellowish green<br>powder : light greenish yellow<br>origin : probably Thetford Mines, Eastern Townships, Québec<br><br>mineral : cement[1138]<br>powder : white<br><br>production process:<br>6 g of rocks of various sizes + 27.40 g of cement + 13 cc of water / manual grinding / moulding / hardening / irradiated with gamma rays at 18.85 Mrad[381] |
| dark olive-green | 2419 | mineral : serpentine<br>rock : pronounced yellowish green (olive green type)<br>origin : Lac Saint-Jean, Québec<br><br>production process:<br>(followed from «green [brown tone]»)<br>rock irradiated with gamma rays at 482.984 Mrad |
| dark olive-green | 2420 | mineral : smaltite[25], a variety of skutterudite<br>rock : dark iron-grey, with silver metallic brilliance<br>powder : dark grey<br>origin : Cobalt, Ontario<br><br>production process:<br>(followed from «dark violet [blue tone]»)<br>0↑1900 °F (dark brown): .30 g + 50 ml hydrochloric acid / soaking 2 wk. / separation of the liquid and the solid / drying on hot plate (colour of the liquid: very intense peacock-blue) / irradiated with gamma rays at 424.7 Mrad |
| | 2421 | mineral : idocrase<br>rock : yellowish green<br>powder : beige (green tone)<br>origin : Jeffrey Mine, Asbestos (presently J.-M. Asbestos), Québec |

| | | |
|---|---|---|
| | | production process: |
| | | (followed from «green [light honey-yellow tone]») |
| | | rock irradiated with gamma rays at: |
| dark and accentuated olive-green | 2422 | 57.4 Mrad |
| ¦ | | |
| olive-green still darker and more accentuated | 2423 | 148.4 Mrad |
| ↓ | | |
| olive-green still darker and more accentuated | 2424 | 360 Mrad |
| | | (followed at «olive-green [light brown tone]») |
| | | mineral : apatite |
| | | rock : dark grass-green (yellow tone), very slightly translucid |
| | | powder : powder filtered at 14 meshes: very, very light green; powder filtered beneath 14 meshes: light grey (beige tone and green reflection) |
| | | origin : Ile Calumet, Pontiac county, Québec |
| | | production process: |
| | | rock irradiated with gamma rays at: |
| olive-green darker than «dark olive-green» | 2425 | 5 Mrad |
| ¦ | 2426 | 10 Mrad |
| ¦ | 2427 | 57.4 Mrad |
| ¦ | 2428 | 63.984 Mrad |
| which accentuates | 2429 | 102.4 Mrad |
| itself and dar- | 2430 | 148.4 Mrad |
| ¦ kens | 2431 | 201.6 Mrad |
| ¦ towards | 2432 | 242.804 Mrad |
| ¦ | 2433 | 247.6 Mrad |
| ¦ | 2434 | 287.3 Mrad |
| ¦ | 2435 | 360 Mrad |
| ↓ | 2436 | 423.984 Mrad |
| very dark olive-green | 2437 | 602.804 Mrad[380] |
| | | mineral : serpentine |
| | | rock : yellowish green |
| | | powder : light greenish yellow |
| | | origin : probably Thetford Mines, Eastern Townships, Québec |
| | | production process: |
| | | rock irradiated with gamma rays at: |
| olive-green | 2438 | 57.4 Mrad[382] |
| ¦ | | |

| | | |
|---|---|---|
| which accentuates itself and darkens towards | 2439 | 65.704 Mrad |
| | 2440 | 102.4 Mrad |
| | 2441 | 148.4 Mrad |
| ↓ | | |
| dark olive-green | 2442 | 201.6 Mrad[383] |
| and then | 2443 | 244.53 Mrad |
| ↓ | | |
| blackish green | 2444 | 247.6 Mrad[383,384] (followed at «brown [orange tone and green reflection]») |
| mixture of particles | | |
| | | mineral : dolomite<br>rock : light grey<br>powder : light grey<br>origin : Shefferville, Ungava, Québec |
| | | <u>production process:</u><br>(followed at «light beige») |
| olive-green / beige | 2445 | 2 g of dolomite + 2 g of sodium carbonate / 0↑1700 °F + 1 h at 1700 °F<br>(followed at «olive-green») |
| | | mineral : hypersthene<br>rock : black<br>powder : medium brownish grey<br>origin : Lac Saint-Jean, Québec |
| | | <u>production process:</u><br>(followed from «dark brown»)<br>2 g of hypersthene + 2 g of sodium carbonate: |
| olive-green / brown | 2446 | 0↑1600 °F + 30 min. at 1600 °F |
| ↓ | | |
| olive-green / brown | 2447 | 0↑1600 °F + 1 h at 1600 °F<br>(followed at «olive-green») |
| | | mineral : uraninite<br>rock : medium chocolate-brown (red Bordeau tone)<br>powder : medium milky chocolate-brown<br>origin : Yellowknife, Canada |
| | | <u>production process:</u><br>(followed from «brown darker than "brown" [with a few olive-green particles]»)<br>2 g of uraninite + 2 g of sodium carbonate: |
| olive-green / medium brown | 2448 | 0↑1500 °F + 15 min. at 1500 °F |
| ↓ | | |
| olive-green / | 2449 | 0↑1500 °F + 30 min. at 1500 °F |

| | | |
|---|---|---|
| light brown (orange tone) | | (followed at «olive-green») |
| olive-green / beige | 2450 | mineral : antigorite<br>rock : pale yellowish green<br>powder : very pale greenish yellow<br>origin : Canadian Refractories Mine, Kilmar, Québec<br><br>production process:<br>(followed from «light mint-green»)<br>2 g of antigonite + 2 g of sodium carbonate /<br>0↑1900 °F + 1 h at 1900 °F |
| olive-green / brown | 2451 | mineral : spodumene<br>rock : pale green<br>powder : light grey, almost white<br>origin : Québec Lithium Co., Baraute, Abitibi, Québec<br><br>production process:<br>(followed from «beige [light orange tone] lighter than "beige [orange tone]"»)<br>2 g of spodumene + 2 g of sodium carbonate /<br>0↑1500 °F + 1 h at 1500 °F<br>(followed at «light emerald-green») |
| olive-green (mint-green tone) | | |
| olive-green (light mint-green tone) much darker than «intense olive-green (mint-green tone)» | 2452 | mineral : chalcocite<br>rock : dark iron-grey (localized turquoise oxidation)<br>powder : dark iron-grey<br>origin : Butte, Montana, United States<br><br>production process:<br>4 g of chalcocite + 100 ml sulphuric acid / soaking: 2 wk. / separation of the liquid and the solid / drying on hot plate (colour of the solid: intense olive-green) / irradiated with gamma rays at 64.7 Mrad<br>(followed at «medium milky chocolate-brown [green reflection]») |
| olive-green (yellow tone) | | |
| | | mineral : galena<br>rock : dark grey, with metallic brilliance<br>powder : dark grey, with metallic brilliance<br>origin : Trail, British Columbia |

| | | |
|---|---|---|
| light olive-green (yellow tone) [with orange areas] | 2452.1 | production process: 150 g of molten glass (sodalime) is collected, at the state of fusion, in the furnace (1200 °C) on a metal rod / .45 g of powdered galena is sprinkled at the surface of the glass / then, the entity is put in the furnace and melted with the flame at 1200 °C / then, the collect is taken off the metal rod[280] |
| olive-green (yellow tone) [different from the one below] | 2453 | mineral : bauxite[92]<br>powder : pinkish beige, mat<br>origin : Alcan Company, French Guyana<br><br>production process:<br>0↑1000 °F (pinkish chamois): 3 g + 25 ml hydrochloric acid / soaking: 3 d. / drying on hot plate (followed at «yellow [orange tone] of various tints» and «olive-green [brown tone]») |
| olive-green (yellow tone) [different from the one above] | 2454 | production process:<br>3 g of bauxite + 25 ml hydrochloric acid / soaking: 5 d. / drying on hot plate (followed at «pronounced olive-green» and «olive-green [brown tone]») |
| accentuated olive-green (yellow tone) ↓ | 2455 | mineral : beryl<br>rock : light blue (near turquoise), slightly translucid<br>powder : light grey<br>origin : Lacorne district, Abitibi, Québec<br><br>production process:<br>(followed from «apple-green [yellow tone]»)<br>rock[67,73] irradiated with gamma rays at:<br>247.6 Mrad |
| olive-green (yellow tone) still more accentuated | 2456 | 287.3 Mrad<br><br>(followed at «beige [green tone]») |
| | | mineral : copper concentrate (Cu-FeS)<br>powder : medium chocolate-brown (grey tone)<br>origin : Centre de recherche des Mines Noranda in Montréal, Québec<br><br>production process:<br>4 g of concentrate + 50 ml nitric acid / soaking: 2 h / separation of the liquid and the solid in 6 parts: a) pure liquid: natural drying; b) pure liquid: drying on sand bath; c) liquid + a bit of solid: natural drying; d) pure solid: natural |

| | | |
|---|---|---|
| olive-green (light yellow tone) ↓ more intense olive-green (yellow tone) | 2457<br>2458 | drying; e) pure solid: drying on sand bath; f) solid coming from c): natural drying<br>colour of c): liquid + a bit of solid: natural drying<br>colour of f)[390]: the solid coming from c): natural drying |
| olive-green (yellow tone) | 2459 | mineral : labrador<br>rock : blackish grey<br>powder : medium grey<br>origin : Lac Saint-Jean, Québec<br><br>production process:<br>(followed from «accentuated olive-green»)<br>2 g of labrador + 2 g of sodium carbonate / 0↑1700 °F + 1 h at 1700 °F<br>(followed at «intense greenish blue») |
| olive-green (yellow tone) | 2460 | mineral : shale (formation of Sillery[359])<br>rock : brownish red<br>powder : pinkish brown, mat<br>origin : bank of St.-Lawrence river at Berthier-Sur-Mer at the rear of Dénechaud manor, Québec<br><br>production process:<br>3 g of shale + 25 ml hydrochloric acid / soaking: 4 d. / drying on hot plate<br>(followed at «khaki-beige [green tone]» and «reddish beige of various tones») |
| olive-green (yellow tone) a bit darker than «olive-green (yellow tone)» | 2461 | mineral : chalcocite<br>rock : dark iron-grey (with localized turquoise oxidation)<br>powder : dark iron-grey<br>origin : Butte, Montana, United States<br><br>production process:<br>(followed from «grass-green»)<br>4 g of chalcocite + 100 ml nitric acid / soaking: 2 wk. / separation of the liquid (1st) and the solid / desiccation of the 1st liquid (colour of the 1st liquid: very intense emerald-green) / addition to the same solid of 100 ml nitric acid / soaking: 2 wk. / separation of the liquid (2nd) and the solid / desiccation of the 2nd liquid (colour of the 2nd liquid: mixture of particles: very vivid blue / acute greenish turquoise) / natural drying of the solid (colour of the solid: intense green [between «grass-green» and «Paris green»]) / the |

| | | |
|---|---|---|
| | | solid is irradiated with gamma rays at 424.7 Mrad |
| olive-green (light yellow tone) lighter than «dark olive-green (yellow tone)» | 2462 | mineral : galena<br>rock : dark grey, with metallic brilliance<br>powder : dark grey, with metallic brilliance<br>origin : Trail, British Columbia<br><br>production process:<br>(followed from «dark olive-green»)<br>.45 g of galena + .45 g of sodium carbonate / deposited on a piece of glass measuring 1" x 1" x 1/8" / 0↑1800 °F / slow cooling in furnace[280] |
| medium olive-green (yellow tone) [with orange areas] | 2462.1 | production process:<br>(followed from «light olive-green [yellow tone]»)<br>150 g of molten glass (sodalime) is collected, at the state of fusion, in a furnace (1200 °C) on a metal rod / 1 g of powdered galena is sprinkled at the surface of the glass / then, the «collect» is taken off the metal rod[280]<br>(followed at «dark olive-green [with "metallic grey reflections"]») |
| olive-green (yellow tone) much more accentuated than «olive-green (yellow tone)» | 2463 | mineral : agate<br>rock : grey (with a light orange circular area on the surface), slightly translucid<br>powder : very light grey<br>origin : unknown<br><br>production process:<br>3 g of agate + 40 ml hydrochloric acid / soaking: 1 wk. / separation of the liquid and the solid / natural drying (colour of the liquid: green) / irradiated with gamma rays at 64.7 Mrad<br>(followed at «mixture of particles: dark beige / dark brown») |
| olive-green (yellow tone) a bit | 2463.1 | mineral : orpiment<br>rock : vivid yellow (orange tone)<br>powder : vivid yellow (orange tone)<br>origin : Nevada, United States<br><br>vegetable : indigo<br>powder : very dark indigo-blue<br><br>production process:<br>1 g of orpiment + 0.14061 g of indigo + 0.14061 g of MgO / grinding |

| | | |
|---|---|---|
| more pale than «intense olive-green (yellow tone)» | | |
| olive-green (yellow tone) a bit more pale than «intense olive-green (yellow tone)» | 2463.2 | <u>production process:</u><br>1 g of orpiment + 0.14061 g of indigo + 0.28122 g of potassium carbonate / grinding |
| intense olive-green (yellow tone) | 2463.3 | <u>production process:</u><br>1 g of orpiment + 0.14061 g of indigo / grinding |
| olive-green (yellow tone) fairly dark | 2464 | mineral : agate<br>rock : grey (with a light orange circular area on the surface), slightly translucid<br>powder : very light grey<br>origin : unknown<br><br><u>production process:</u><br>3 g of agate + 40 ml hydrochloric acid / soaking: 1 wk. / separation of the liquid and the solid / natural drying (colour of the solid: white) / irradiated with gamma rays at 64.7 Mrad (followed at «mixture of particles: beige / brown») |
| olive-green (yellow tone) a bit more pale than «dark olive-green (yellow tone)» | 2464.1 | mineral : orpiment<br>rock : vivid yellow (orange tone)<br>powder : vivid yellow (orange tone)<br>origin : Nevada, United States<br><br>vegetable : indigo<br>powder : very dark indigo-blue<br><br>animal : dried pork blood<br>powder : dark brown (red tone and orange reflection)<br><br><u>production process:</u><br>1 g of orpiment + 0.14061 g of indigo + 0.28122 g of dried pork blood + 0.14061 g of MgO / grinding |
| olive-green (yellow tone) a bit | 2464.2 | <u>production process:</u><br>1 g of orpiment + 0.14061 g of indigo + 0.28122 g of dried pork blood + 0.28122 g of potassium |

| | | |
|---|---|---|
| more pale than «dark olive-green (yellow tone)» | | carbonate / grinding |
| dark olive-green (yellow tone) | 2464.3 | <u>production process:</u><br>1 g of orpiment + 0.14061 g of indigo + 0.28122 g of dried pork blood / grinding |
| olive-green (orange tone) | | |
| pronounced olive-green (localized orange reflection) | 2465 | mineral : chromite<br>rock : blackish grey<br>powder : medium brownish grey<br>origin : Black Lake, Thetford Mines, Québec<br><br><u>production process:</u><br>2 g of chromite + 2 g of sodium carbonate / 0↑1900 °F + 1:45 h at 1900 °F (apple-green darker than «dark apple-green») / irradiated with gamma rays at 64.7 Mrad[239]<br>(followed at «medium greenish brown [localized orange reflection]») |
| dark olive-green localized orange reflection) | 2466 | mineral : galena<br>rock : dark grey, with metallic brilliance<br>powder : dark grey, with metallic brilliance<br>origin : Trail, British Columbia<br><br><u>production process:</u><br>(followed from «medium orange ochre»)<br>1 g of powdered galena deposited on a piece of glass measuring 1" x 1" x 1/8" / 0↑1500 °F / slow cooling in furnace[280]<br>(followed at «medium and vivid yellowish orange [green reflection]») |
| olive-green (amber tone) | | |
| olive-green (light amber tone) | 2466.1 | mineral : graphite<br>rock : dark grey, with metallic brilliance<br>powder : dark grey, with metallic brilliance<br>origin : Grenville, Québec<br><br><u>production process:</u><br>(followed from «olive-green darker than "olive-green"»)<br>1% of graphite is mixed with molten glass and the entity is melted at 2,400 °F (dark colour [between «apple-green» and «olive-green»]) / irradiated with gamma rays at 9.88 Mrad |

| olive-green (brown tone) | | |
|---|---|---|
| olive-green (brown tone) | 2467 | mineral : bloody agate<br>rock : dark grass-green, slightly translucid<br>powder : light grey (light green tone)<br>origin : India<br><br>production process:<br>(followed from «medium orange ochre»)<br>8 g of agate + 40 ml hydrochloric acid / soaking: 1 wk. / separation of the liquid and the solid / natural drying (colour of the solid: vivid apple-green) / irradiated with gamma rays at 64.7 Mrad<br>(followed at «dark brownish green») |
| olive-green (light brown tone) | 2468 | mineral : idocrase<br>rock : yellowish green<br>powder : beige (green tone)<br>origin : Jeffrey Mine, Asbestos (presently J.-M. Asbestos), Québec<br><br>production process:<br>(followed from «dark and accentuated olive-green»)<br>rock irradiated with gamma rays at 365.7 Mrad |
| olive-green (brown tone) | 2469 | mineral : bauxite<br>powder : pinkish beige, mat<br>origin : Alcan Company, French Guyana<br><br>production process:<br>(followed from «olive-green [yellow tone]»)<br>3 g of bauxite + 5 ml nitric acid + 20 ml hydrochloric acid / soaking: 4-5 d. / drying on hot plate<br>(followed at «greenish beige») |
| olive-green (brown tone) | 2470 | mineral : almandite<br>rock : dark brownish red<br>powder : medium brownish red<br>origin : Gore Mountain, Warren county, New York State, United States<br><br>production process:<br>(followed from «brown [olive-green tone]»)<br>2 g of almandite + 2 g of sodium carbonate / 0↑1500 °F + 1 h at 1500 °F<br>(followed at «dark chocolate-brown») |
| | | mineral : orpiment<br>rock : vivid yellow (orange tone) |

| | | |
|---|---|---|
| | | powder : vivid yellow (orange tone)<br>origin : Nevada, United States<br><br>vegetable : indigo<br>powder : very dark indigo-blue<br><br>mineral : zirconium oxide<br>powder : light beige<br>origin : Tam Ceramic Inc., Montréal, Québec<br><br><u>production process:</u> |
| olive-green (brown tone) a bit more pale than «medium olive-green (brown tone)» | 2470.1 | 1 g of orpiment + 0.14061 g of indigo irradiated with gamma rays at 2.26 Mrad + 0.14061 g of zirconium oxide / grinding |
| | | mineral : orpiment<br>rock : vivid yellow (orange tone)<br>powder : vivid yellow (orange tone)<br>origin : Nevada, United States<br><br>vegetable : indigo<br>powder : very dark indigo-blue<br><br><u>production process:</u> |
| olive-green (brown tone) a bit more pale than «medium olive-green (brown tone)» | 2470.2 | 1 g of orpiment + 0.14061 g of indigo irradiated with gamma rays at 2.26 Mrad + 0.28122 g of sodium carbonate / grinding |
| medium olive-green (brown tone) | 2470.3 | <u>production process:</u><br>1 g of orpiment + 0.14061 g of indigo irradiated with gamma rays at 2.26 Mrad / grinding |
| | | mineral : bloody agate<br>rock : dark grass-green, slightly translucid<br>powder : light grey (light green tone)<br>origin : India<br><br><u>production process:</u> |
| olive-green (brown tone) much darker than «medium olive-green (brown tone)» | 2471 | 8 g of agate + 40 ml hydrochloric acid / soaking: 1 wk. / separation of the liquid and the solid / natural drying (colour of the liquid: medium olive-green) / irradiated with gamma rays at 64.7 Mrad (followed at «very dark brownish grey, almost black») |
| | | mineral : epidote<br>rock : green (light brown tone [olive-green type]) |

413

| | | |
|---|---|---|
| | | powder : grey (greenish brown tone)<br>origin : Deloro Road, Madoc, Ontario<br><br><u>production process:</u><br>(followed from «olive-green a bit darker than "olive-green"»)<br>rock irradiated with gamma rays at: |
| olive-green (brown tone)<br>↓ | 2472 | 102.4 Mrad |
| olive-green (brown tone) a bit darker<br>↓ | 2473 | 148.4 Mrad |
| olive-green (accentuated brown tone) much darker)<br>↓ | 2474 | 201.6 Mrad |
| olive-green (brown tone a bit more accentuated) slightly darker<br>↓ | 2475 | 247.6 Mrad |
| olive-green (brown tone a bit more accentuated) slightly darker<br>↓ | 2476 | 287.3 Mrad |
| olive-green [between «dark olive-green» and «dark chocolate-brown»] | 2477 | 360 Mrad<br><br>(followed at «dark chocolate-brown») |
| | | mineral : PbO<br>powder : yellow (light orange tone)<br><br><u>production process:</u><br>(followed from «olive-green»)<br>irradiated with gamma rays at: |
| olive-green (accentuated green and brown tones)<br>↓ | 2478 | 201.6 Mrad |
| olive-green (green and brown tones still more accentuated) | 2479 | 242.804 Mrad<br><br>(followed at «brown [olive-green tone]») |
| | 2480 | mineral : tremolite<br>rock : olive green (grey tone) |

| | | |
|---|---|---|
| | | powder : greyish beige<br>origin : Tetreault Mine, Montauban, Portneuf county, Québec<br><br>production process:<br>rock[228] irradiated with gamma rays at: |
| olive-green | 2481 | 5 Mrad |
| (brown tone) more accentuated than «olive-green (brown tone)»<br>↓ | 2482 | 10 Mrad |
| olive-green | 2483 | 57.4 Mrad |
| (brown tone) still more accentuated<br>↓ | 2484 | 65.704 Mrad |
| olive-green (brown tone) much more accentuated<br>↓ | 2485 | 102.4 Mrad |
| olive-green (brown tone) much more accentuated | 2486 | 124.704 Mrad |
| ↓ | 2487 | 148.4 Mrad |
| which evolves | 2488 | 201.6 Mrad |
| towards | 2489 | 247.6 Mrad |
| ↓ | 2490 | 287.3 Mrad |
| dark olive-green | 2491 | 360 Mrad |
| (brown tone) | | (followed at «black») |
| olive-green (grey tone) | | |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «Naples yellow [accentuated green tone] darker than "Naples yellow [green tone]"») |
| medium olive-green (grey tone) | 2492 | 1100 °F / 1 h (Naples yellow [green tone]) / irradiated with gamma rays at 424.7 Mrad |
| | | mineral : steatite<br>rock : light evergreen<br>powder : white<br>origin : East Broughton, Québec<br><br>production process:<br>(followed from «evergreen»)<br>rock irradiated with gamma rays at: |
| dark olive-green | 2493 | 201.6 Mrad |

415

| | | |
|---|---|---|
| (grey tone)<br>↓ | | |
| darker olive-green (grey tone)<br>↓ | 2494 | 247.6 Mrad |
| darker olive-green (grey tone)<br>↓ | 2495 | 287.3 Mrad |
| darker and more accentuated olive-green (grey tone)<br>↓ | 2496 | 360 Mrad |
| much darker olive-green [browner] (grey tone) | 2497 | 484.704 Mrad |
| pearly green [between «olive-green» and «lichen-green»] | | |
| light pearly green [between «olive-green» and «lichen-green»] | 2498 | mineral : sandstone<br>rock : medium pinkish brown (light violet tone)<br>powder : medium pinkish brown (light violet tone)<br>origin : at the back of Percé, Gaspésie, Québec<br><br>production process:<br>1 g of sandstone + 2 g of sodium carbonate / 0↑1800 °F |
| light pearly green [between «olive-green» and «lichen-green»] | 2499 | production process:<br>1 g of sandstone + 3 g of potassium carbonate / 0↑1800 °F[385] |
| green [between «olive-green» and «phtalo[217a]-green»] | | |
| green [between «olive-green» and «phtalo-green»] | 2500 | mineral : ochre[20]<br>powder : orange<br>origin : small copper and nickel deposit, in the South-Western area of a mass of serpentinite at 3 km at the West of Saint-Fabien-de-Panet, Québec<br><br>production process:<br>1 g of ochre + 2 g of sodium carbonate / 0↑1800 °F |

| | | |
|---|---|---|
| green [between «olive-green» and «apple-green»] | | |
| green [between «olive-green» and «apple-green»], much more intense and a bit darker and luminous than «intense and dark mint-green» | 2501 | mineral : chromite[294]<br>rock : dark grey<br>powder : dark grey<br>origin : Black Lake, Eastern Townships, Québec<br><br>production process:<br>(followed from «mint-green [very light yellow tone]»)<br>2 g of chromite + 20 ml phosphoric acid / soaking: 3 d. / drying on sand bath (intense and dark mint-green) / irradiated with gamma rays at 424.7 Mrad |
| dark colour [between «apple-green» and «olive-green»] | 2501.1 | mineral : graphite<br>rock : dark grey, with metallic brilliance<br>powder : dark grey, with metallic brilliance<br>origin : Grenville, Québec<br><br>production process:<br>1% of graphite is mixed with molten glass and the entity is melted at 2,400 °F<br>(followed at «light bluish turquoise») |
| mossy olive-green | | |
| colour between «brownish red» and «mossy olive-green» | 2502 | mineral : goethite[106]<br>powder : rusty orange<br>origin : Red Mill, in the suburbs of Cap-de-la-Madeleine, Québec<br><br>production process:<br>(followed from «brownish red»)<br>4 g of goethite + 4 g of sodium[386] carbonate:<br>0↑1500 °F[387] |
| ↓ mossy olive-green | 2503 | 0↑1600 °F[388] |
| ↓ mossy olive-green | 2504 | 0↑1700 °F[388] |
| ↓ mossy olive-green | 2505 | 0↑1800 °F[389]<br>(followed at «iron-grey») |

417

| | | |
|---|---|---|
| colour between «brownish red» and «mossy olive-green» | 2506 | production process: (followed from «brownish red») 4 g of goethite + 3 g of sodium carbonate: 0↑1500 °F387 |
| mossy olive-green | 2507 | 0↑1600 °F388 |
| mossy olive-green | 2508 | 0↑1700 °F388 |
| ↓ mossy olive-green | 2509 | 0↑1800 °F389 (followed at «iron-grey») |
| colour between «brownish red» and «mossy olive-green» | 2510 | production process: (followed from «brownish red») 4 g of goethite + 2 g of sodium carbonate: 0↑1600 °F387 |
| mossy olive-green | 2511 | 0↑1700 °F388 |
| ↓ mossy olive-green | 2512 | 0↑1800 °F389 (followed at «iron-grey») |
| colour between «brownish red» and «mossy olive-green» | 2513 | production process: (followed from «brownish red») 4 g of goethite + 1 g of sodium carbonate: 0↑1600 °F387 |
| mossy olive-green | 2514 | 0↑1700 °F388 |
| ↓ mossy olive-green | 2515 | 0↑1800 °F389 (followed at «iron-grey») |
| colour between «brownish red» and «mossy olive-green» | 2516 | production process: (followed from «brownish red») 3 g of goethite + 4 g of sodium carbonate: 0↑1500 °F387 |
| mossy olive-green | 2517 | 0↑1600 °F388 |
| mossy olive-green ↓ | 2518 | 0↑1700 °F388 |

418

| | | |
|---|---|---|
| mossy olive-green | 2519 | 0↑1800 °F[389] (followed at «iron-grey») |
| | | production process: 3 g of goethite + 4 g of sodium carbonate / 1700 °F: |
| colour between «brownish red» and «mossy olive-green» | 2520 | 15 min.[387] |
| ↓ more intense mossy olive-green | 2521 | 30 min. |
| ↓ much more intense mossy olive-green | 2522 | 45 min. |
| ↓ mossy olive-green still more intense | 2523 | 50 min. |
| ↓ mossy olive-green still more intense | 2524 | 55 min. |
| ↓ mossy olive-green still more intense | 2525 | 60 min. |
| ↓ mossy olive-green still more intense | 2526 | 1:30 h |
| | | production process: (followed from «brownish red») 2 g of goethite + 4 g of sodium carbonate: |
| colour between «brownish red» and «mossy olive-green» | 2527 | 0↑1500 °F[387] |
| ↓ mossy olive-green | 2528 | 0↑1600 °F[388] |
| ↓ mossy olive-green | 2529 | 0↑1700 °F[388] |
| ↓ mossy olive-green | 2530 | 0↑1800 °F[389] (followed at «iron-grey») |
| | | production process: (followed from «brownish red») 1 g of goethite + 4 g of sodium carbonate: |
| colour between | 2531 | 0↑1500 °F[387] |

| | | |
|---|---|---|
| «brownish red» and «mossy olive-green» | | |
| ↓ | | |
| mossy olive-green | 2532 | 0↑1600 °F388 |
| ↓ | | |
| mossy olive-green | 2533 | 0↑1700 °F388 |
| ↓ | | |
| mossy olive-green | 2534 | 0↑1800 °F389 (followed at «iron-grey») |
| | | production process: (followed from «brownish red») 2 g of goethite + 3 g of sodium carbonate: |
| colour between «brownish red» and «mossy olive-green» | 2535 | 0↑1600 °F387 |
| ↓ | | |
| mossy olive-green | 2536 | 0↑1700 °F388 |
| ↓ | | |
| mossy olive-green | 2537 | 0↑1800 °F389 (followed at «iron-grey») |
| | | production process: (followed from «brownish red») 1 g of goethite + 3 g of sodium carbonate: |
| colour between «brownish red» and «mossy olive-green» | 2538 | 0↑1600 °F387 |
| ↓ | | |
| mossy olive-green | 2539 | 0↑1700 °F388 |
| ↓ | | |
| mossy olive-green | 2540 | 0↑1800 °F389 (followed at «iron-grey») |
| | | production process: (followed from «brownish red») 3 g of goethite + 1 g of sodium carbonate: |
| mossy olive-green | 2541 | 0↑1700 °F387,388 |
| ↓ | | |
| mossy olive-green | 2542 | 0↑1800 °F389 (followed at «iron-grey») |
| | | production process: (followed from «brownish red») 3 g of goethite + 2 g of sodium carbonate: |
| colour between «brownish red» and «mossy olive-green» | 2543 | 0↑1500 °F387 |
| ↓ | | |

| | | |
|---|---|---|
| mossy olive-green | 2544 | 0↑1600 °F[388] |
| ↓ | | |
| mossy olive-green | 2545 | 0↑1700 °F[388] |
| ↓ | | |
| mossy olive-green | 2546 | 0↑1800 °F[389]<br>(followed at «iron-grey») |
| mossy olive-green<br>↓<br>mossy olive-green | 2547<br><br>2548 | production process:<br>(followed from «brownish red»)<br>1 g of goethite + 1 g of sodium carbonate:<br>0↑1700 °F[387,388]<br><br>0↑1800 °F[388]<br>(followed at «iron-grey») |
| accentuated mossy olive-green | 2549 | production process:<br>1 g of goethite + 2 g of sodium carbonate:<br>/ 0↑1700 °F / cooling: 1 g + 1 g of sodium carbonate / 0↑1700 °F |
| mossy olive-green | 2550 | production process:<br>.50 g of goethite + .50 g of sodium carbonate /<br>1600 °F / 1 h |
| mossy olive-green | 2551 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Montréal, Québec<br><br>production process:<br>(followed from «medium greyish brown [red tone and violet reflection]»)<br>.50 g of goethite + .50 g of sodium carbonate +<br>.50 g of zirconium silicate / 1700 °F / 1 h |
| intense mossy olive-green | 2552 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>1 g of goethite + 1 g of sulphur / 0↑1700 °F /<br>cooling: .50 g + 1 g of sodium carbonate /<br>0↑1700 °F |

| | | |
|---|---|---|
| | | (followed at «blackish green») |
| lime-green | | |
| very, very acute lime-green (yellow tone)<br>↓<br>lime-green still more intense | 2553<br><br><br>2554 | mineral : bornite<br>rock : reddish brown (with localized green and bluish green oxidation)<br>powder : reddish brown<br>origin : Lac Musset, Fosse du Labrador, Québec<br><br>production process:<br>(followed from «light and very vivid azure-blue» and «dark beige [orange tone]»)<br>1 g of bornite + 40 ml hydrochloric acid / soaking: 6 d. / separation of the liquid and the solid / natural drying / colour of the solid[391]<br><br>(followed from «light and acute phtalo-green»)<br><br>1 g of bornite + 50 ml hydrochloric acid / soaking: 6 d. / separation of the liquid and the solid / natural drying / colour of the solid[392]<br>(followed at «very vivid canary-yellow») |
| apple-green | | |
| very pale apple-green<br>↓<br>apple-green a bit more pronounced | 2555<br><br>2556 | mineral : dolomite<br>rock : white (localized yellow reflection), crystalline and translucid<br>powder : white<br>origin : Bristol district, Pontiac county, Québec<br><br>production process:<br>(followed from «orange [green tone]»)<br>2 g of dolomite + 2 g of sodium carbonate:<br>0↑1800 °F + 1 h at 1800 °F<br><br>0↑1900 °F + 1 h at 1900 °F |
| very pale apple-green (diminished | 2557 | mineral : beryl<br>rock : intense grass-green, slightly translucid<br>powder : greenish grey<br>origin : unknown<br><br>production process:<br>(followed from «apple-green much darker than "pale apple-green"»)<br>3 g of beryl + 40 ml nitric acid / soaking: 1 wk. / separation of the liquid and the solid / natural |

| | | |
|---|---|---|
| green tone) | | drying (colour of the liquid: «pale apple-green» crystals with a fine «lemon-yellow» powder / the «pale apple-green» crystals are irradiated with gamma rays at 425.65 Mrad[394] |
| very pale apple-green | 2558 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 2 g of sodium carbonate / 0†1800 °F + 1 h at 1800 °F (pale apple-green) / irradiated with gamma rays at 64.7 Mrad |
| pale apple-green<br>↓<br>pale apple-green (more accentuated green tone) | 2559<br><br>2560 | production process:<br>2 g of fluorine + 2 g of sodium carbonate / 0†1800 °F + 1 h at 1800 °F (pale apple-green) / irradiated with electrons at:<br>162,431 rad<br><br>302,831 rad[45] |
| pale apple-green | 2561 | mineral : sardonyx<br>rock : white, slightly translucid (with a light orange-amber circular area on the surface)<br>powder : very light grey<br>origin : unknown<br><br>production process:<br>4 g of sardonyx + 40 ml hydrochloric acid / soaking: 14 d. / separation of the liquid and the solid / natural drying / colour of the solid[395] |
| pale apple-green | 2562 | mineral : beryl<br>rock : intense grass-green, slightly translucid<br>powder : greenish grey<br>origin : unknown<br><br>production process:<br>3 g of beryl + 40 ml hydrochloric acid / soaking: 1 wk. / separation of the liquid and the solid / natural drying / colour of the solid[396] |
| pale apple-green | 2563 | production process:<br>3 g of beryl + 40 ml nitric acid / soaking: 1 wk. / separation of the liquid and the solid / natural drying / colour of the liquid[397] |

423

| | | |
|---|---|---|
| | | mineral : beryl<br>rock : very light yellowish green, slightly translucid<br>powder : white (green reflection)<br>origin : Lacorne district, Abitibi, Québec |
| | | <u>production process:</u><br>(followed from «brown darker than "brown"»)<br>2 g of beryl + 2 g of sodium carbonate: |
| pale apple-green<br>↓ | 2564 | 0↑1700 °F + 1 h at 1700 °F |
| apple-green more acute | 2565 | 0↑1800 °F + 1 h at 1800 °F<br>(followed at «medium greenish turquoise [accentuated blue tone]») |
| | | mineral : bornite<br>rock : reddish brown (with localized green and bluish green oxidation)<br>powder : reddish brown<br>origin : Lac Musset, Fosse du Labrador, Québec |
| | | <u>production process:</u><br>(followed from «pronounced greenish turquoise» and «medium apple-green [grey tone]») |
| pale apple-green | 2566 | 1 g of bornite + 20 ml nitric acid / soaking: 6 d. / separation of the liquid and the solid / natural drying / colour of the solid[54]<br>(followed at «intense bluish turquoise») |
| pale apple-green | 2567 | 1 g of bornite + 30 ml nitric acid / soaking: 6 d. / separation of the liquid and the solid / natural drying / colour of the solid[398]<br>(followed at «pale phtalo-green»)<br>(followed from «emerald-green» and «medium phtalo-green») |
| ↓<br>pale apple-green | 2568 | 3 g of bornite + 50 ml nitric acid / soaking: 6 d. / separation of the liquid and the solid / natural drying / colour of the solid[55] |
| | | mineral : chalcopyrite<br>rock : brass-yellow, with metallic luster<br>powder : dark grey (with golden particles)<br>origin : Noranda Mines, Noranda, Abitibi, Québec |
| | | <u>production process:</u> |
| pale apple-green | 2569 | 5 g of chalcopyrite + 20 ml nitric acid / soaking: 15 h / separation of the liquid and the solid / |

| | | |
|---|---|---|
| | | natural drying (colour of the 1st liquid: vivid apple-green) / matter deposits itself at the bottom of the 1st liquid / separation of this matter and the liquid / natural drying / colour of the matter<br>(followed at «apple-green [yellow tone]») |
| | | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>(followed from «whitened cream»)<br>2 g of fluorine + 2 g of sodium carbonate: |
| pale apple-green | 2570 | 0↑1700 °F + 1 h at 1700 °F |
| ↓ apple-green more pale | 2571 | 0↑1800 °F + 1 h at 1800 °F |
| ↓ apple-green still more pale | 2572 | 0↑1900 °F + 1 h at 1900 °F |
| | | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process: |
| pale apple-green / pale yellow (orange tone) | 2573 | .45 g of powdered galena + .45 g of sulphur / deposited on a piece of glass measuring 1" x 1" x 1/8" / 0↑1450 °F / slow cooling in furnace[280]<br>(followed at «light apple-green [yellow reflection]») |
| | | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of St.-Urbain, Québec<br><br>production process: |
| pale apple-green | 2574 | 2 g of silica + 2 g of sodium carbonate / 0↑1800 °F + 1 h at 1800 °F (apple-green a bit darker than «light apple-green») / irradiated with electrons at 162,431 rad |

425

| | | |
|---|---|---|
| | | (followed at «mixture of particles: very pale apple-green / pale beige») |
| pale apple-green | 2575 | mineral : sardonyx<br>rock : white, slightly translucid (with a light orange-amber circular area on the surface)<br>powder : very light grey<br>origin : unkown<br><br>production process:<br>4 g of sardonyx + 40 ml hydrochloric acid / soaking: 14 d. / separation of the liquid and the solid / natural drying (colour of the liquid: light and vivid apple-green) / irradiated with gamma rays at 64.7 Mrad (followed at «mixture of particles: honey-yellow [orange tone] / dark chocolate-brown») |
| apple-green more pronounced than «pale apple-green» | 2576 | mineral : beryl<br>rock : very light yellowish green, slightly translucid<br>powder : white (green reflection)<br>origin : Lacorne district, Abitibi, Québec<br><br>production process:<br>2 g of beryl + 2 g of sodium carbonate / 0↑1700 °F + 1 h at 1700 °F (pale apple-green) / irradiated with gamma rays at 63.88 Mrad (followed at «greyish green») |
| apple-green much darker [green tone more accentuated, less yellow] than «pale apple-green» | 2577 | mineral : beryl<br>rock : intense grass-green, slightly translucid<br>powder : greenish grey<br>origin : unknown<br><br>production process:<br>3 g of beryl + 40 ml nitric acid / soaking: 1 wk. / separation of the liquid and the solid / natural drying (colour of the liquid: «pale apple-green» crystals with a fine «lemon-yellow» powder) / irradiated with gamma rays at 65.65 Mrad[24] (followed at «very pale apple-green [diminished green tone]») |
| very light apple-green | 2578 | production process:<br>3 g of beryl + 40 ml nitric acid / soaking: 1 wk. / separation of the liquid and the solid / natural drying / colour of the solid[24,399] |
| | | mineral : iron sulphide - nickel[353] |

426

| | | |
|---|---|---|
| very light apple-green | 2579 | rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «vivid apple-green»)<br>20 g of iron sulphide - nickel + 100 ml hydrochloric acid / soaking: 1 wk. / drying in oven at 100 °F<br>(followed at «apple-green» and «very vivid apple-green») |
| apple-green much more accentuated than «very light apple-green» | 2580 | mineral : beryl<br>rock : intense grass-green, slightly translucid<br>powder : greenish grey<br>origin : unknown<br><br>production process:<br>3 g of beryl + 40 ml nitric acid / soaking: 1 wk. / separation of the liquid and the solid / natural drying (colour of the solid: very light apple-green[24]) / irradiated with gamma rays at 65.65 Mrad<br>(followed at «orange brown [grey tone and apple-green reflection]») |
| apple-green more accentuated than «very light apple-green» | 2581 | production process:<br>3 g of beryl + 40 ml nitric acid / soaking: 1 wk. / separation of the liquid and the solid / natural drying ( colour of the solid: very light apple-green[24])/ irradiated with electrons at 164,800 rad<br>(followed at «orange») |
| apple-green more pale [less yellow] than «light apple-green» | 2582 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>5 g of iron sulphide - nickel + 25 ml nitric acid / soaking: 3 d. / drying on hot plate (light apple-green) / irradiated with gamma rays at 64.7 Mrad<br>(followed at «dark beige [light greyish green reflection]») |

| | | |
|---|---|---|
| apple-green ligh-ter, more lumi-nous and pure than «light apple-green» | 2583 | mineral : dolomite<br>rock : white (localized yellow reflection), crystalline and translucid<br>powder : white<br>origin : Bristol district, Pontiac county, Québec<br><br><u>production process:</u><br>2 g of dolomite + 2 g of sodium carbonate / 0↑1900 °F + 1 h at 1900 °F (apple-green a bit more pronounced than «very pale apple-green») / irra-diated with electrons at 302,831 rad[45] |
| light apple-green | 2584 | mineral : blue lace agate<br>rock : light blue (violet tone), slightly translucid<br>powder : very light grey<br>origin : Africa<br><br><u>production process:</u><br>3 g of agate + 40 ml nitric acid / soaking: 1 wk. / separation of the liquid and the solid / natural drying (colour of the liquid: pronounced greenish turquoise) / irradiated with gamma rays at 64.7 Mrad[83]<br>(followed at «light beige») |
| light and vivid apple-green | 2585 | <u>production process:</u><br>3 g of agate + 40 ml hydrochloric acid / soaking: 1 wk. / separation of the liquid and the solid / natural drying / colour of the liquid[160] |
| light apple-green | 2586 | mineral : agate<br>rock : grey (with a light orange circular area on the surface), slightly translucid<br>powder : very light grey<br>origin : unknown<br><br><u>production process:</u><br>(followed from «apple-green»)<br>3 g of agate + 40 ml nitric acid / soaking: 1 wk. / separation of the liquid and the solid / natural drying (colour of the liquid: medium greenish tur-quoise) / irradiated with electrons at 305,200 rad[73] |
| | | mineral : andulusite<br>rock : light brownish grey<br>powder : light grey<br>origin : Bimbowrie, South Australia |

428

| | | |
|---|---|---|
| light apple-green | 2587 | production process:<br>(followed from «beige [green tone]»)<br>2 g of andulusite + 2 g of sodium carbonate /<br>0↑1500 °F + 15 min. at 1500 °F<br>(followed at «mixture of particles: light grass-green / orange») |
| | | mineral : anorthosite<br>rock : dark grey<br>powder : medium grey<br>origin : Jonquière, Lac Saint-Jean, Québec<br><br>production process:<br>(followed from «light greenish beige»)<br>2 g of anorthosite + 2 g of sodium carbonate: |
| light apple-green<br>↓ | 2588 | 0↑1500 °F + 40 min. at 1500 °F |
| apple-green more accentuated | 2589 | 0↑1500 °F + 45 min. at 1500 °F<br>(followed at «green [between "apple-green" and "mint-green"]») |
| light and vivid apple-green | 2590 | production process:<br>rock irradiated with gamma rays at 65 Mrad / grinding: .30 g of irradiated powder + .50 g of sodium carbonate / 1700 °F / 1 h[401] |
| | | mineral : beryl<br>rock : light blue (near turquoise), slightly translucid<br>powder : light grey<br>origin : Lacorne district, Abitibi, Québec<br><br>production process:<br>(followed from «blue»)<br>rock irradiated with gamma rays at: |
| light apple-green<br>↓ | 2591 | 57.4 Mrad[402] |
| more intense apple-green<br>↓ | 2592 | 64.7 Mrad |
| apple-green still more intense | 2593 | 102.4 Mrad[403]<br>(followed at «apple-green [light yellow tone]») |
| | | mineral : copper concentrate (Cu-FeS)<br>powder : medium chocolate-brown (grey tone)<br>origin : Centre de recherche des Mines Noranda in Montréal, Québec<br><br>production process: |
| light apple-green | 2594 | 4 g of concentrate + 50 ml nitric acid / soaking: 2 h / separation of the liquid and the solid in 6 parts: a) pure liquid: natural drying; b) pure |

| | | |
|---|---|---|
| | | liquid: drying on sand bath; c) liquid + a bit of solid: natural drying; d) solid: natural drying; e) solid: drying on sand bath; f) solid derived from c): natural drying / colour of b) pure liquid: drying on sand bath |
| light apple-green | 2595 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>(followed from «light yellow [light green tone]») 0↑1900 °F (dark iron-grey): 1 g + 50 ml hydrochloric acid / soaking: 2 wk. / drying on hot plate (very dark brown, almost black) / irradiated with electrons at 302,831 rad[45] |
| light apple-green | 2596 | mineral : uraninite<br>rock : medium chocolate-brown (red Bordeau tone)<br>powder : medium milky chocolate-brown<br>origin : Yellowknife, Canada<br><br>production process:<br>0↑1900 °F (medium brown [orange tone]): 1 g + 50 ml hydrochloric acid / soaking: 2 wk. / drying on hot plate<br>(followed at «sunny yellow») |
| light and vivid apple-green | 2597 | production process:<br>0↑1900 °F (medium brown [orange tone]): 1 g + 50 ml hydrochloric acid / soaking: 2 wk. / drying on hot plate (light apple-green) / irradiated with electrons at 302,831 rad[45] |
| light apple-green | 2598 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>20 g of quartz - mica + 100 ml hydrochloric acid / soaking: 5 mo. / natural drying |
| | | mineral : silica[91]<br>powder : very light grey, crystalline |

| | | |
|---|---|---|
| | | origin : mine exploited by Développement Gex Inc. of Montréal for exploitation by SKW Bécancour. Lac La Galette, Charlevoix county, 30 miles at the North of St.-Urbain, Québec<br><br>production process:<br>(followed from «very light cream, almost white»)<br>2 g of silica + 2 g of sodium carbonate: |
| light apple-green<br>↓ | 2599 | 0↑1500 °F + 1 h at 1500 °F |
| apple-green a bit darker<br>↓ | 2600 | 0↑1600 °F + 1 h at 1600 °F |
| apple-green identical to the previous one<br>↓ | 2601 | 0↑1700 °F + 1 h at 1700 °F |
| apple-green identical to the previous one<br>↓ | 2602 | 0↑1800 °F + 1 h at 1800 °F |
| apple-green identical to the previous one | 2603 | 0↑1900 °F + 1 h at 1900 °F |
| light apple-green | 2604 | mineral : steatite<br>rock : light cold grey, slightly translucid<br>powder : light grey<br>origin : East Broughton, Québec<br><br>production process:<br>60 g of steatite + 100 ml phosphoric acid / soaking: 3 wk. / separation of the liquid (1st) and the solid / drying on hot plate (still humid) / colour of the 1st liquid[17.406] |
| light apple-green | 2605 | mineral : steatite<br>rock : light evergreen<br>powder : white<br>origin : East Broughton, Québec<br><br>production process:<br>40 g of steatite + 100 ml phosphoric acid / soaking: 3 wk. / separation of the liquid (1st) and the solid / drying on hot plate (still humid) / colour of the 1st liquid[17.406]<br>(followed at «light mint-green») |
| | | mineral : sardonyx<br>rock : white, slightly translucid (with a light orange-amber circular area on |

| | | |
|---|---|---|
| | | the surface)<br>powder : very light grey<br>origin : unkown |
| light and vivid apple-green | 2606 | production process:<br>4 g of sardonyx + 40 ml hydrochloric acid / soaking: 14 d. / separation of the liquid and the solid / natural drying / colour of the liquid[407] |
| light apple-green | 2607 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>5 g of iron sulphide - nickel + 25 ml nitric acid / soaking: 3 d. / drying on hot plate[417]<br>(followed at «apple-green» and «medium iron-grey») |
| apple-green very, very lightly more intense than «light apple-green» | 2608 | production process:<br>5 g of iron sulphide - nickel + 25 ml nitric acid / soaking: 3 d. / drying on hot plate (light apple-green) / irradiated with electrons at 302,831 rad[45] |
| apple-green a bit more intense than «light apple-green» | 2609 | production process:<br>(followed from «light apple-green»)<br>0↑700 °F (grey lighter than «light grey»): 5 g + 25 ml nitric acid / soaking: 3 d. / drying on hot plate[427]<br>(followed at «apple-green [light yellow tone]») |
| apple-green more accentuated than «light apple-green» | 2610 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 15 ml nitric acid + 10 ml hydrochloric acid / soaking: 6 d. / separation of the liquid and the solid / natural drying (colour of the solid: mixture of the particles: light green / accentuated green) / irradiated with electrons at 164,800 rad<br>(followed at «dark green») |

432

| | | |
|---|---|---|
| apple-green much more luminous and intense than «light apple-green» | 2611 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>5 g of iron sulphide - nickel + 15 ml hydrochloric acid + 10 ml water / soaking: 3 d. / drying on hot plate (apple-green less vivid than «vivid apple-green») / irradiated with gamma rays at 63.88 Mrad (followed at «medium milky chocolate-brown [very light green reflection]») |
| apple-green more intense and a bit darker than «light apple-green» | 2612 | mineral : calcite[11,318,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «green [light brown tone]»)<br>.10 g of calcite + .50 g of chrome / 1700 °F / 1 h (apple-green): .3 g + 50 cc of transparent polyester resin + 1% of catalyst / manual grinding / moulding / hardening (light and vivid apple-green) / irradiated with electrons at 305,082 rad[73] |
| apple-green darker than «light apple-green» | 2613 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 15 ml nitric acid + 10 ml hydrochloric acid / soaking: 6 d. / separation of the liquid and the solid / natural drying (colour of the liquid: mixture of particles[40]: bluish green / vivid and light apple-green)/irradiated with gamma rays at 65.65 Mrad<br>(followed at «medium brownish grey») |
| | | mineral : blue lace agate<br>rock : light blue (violet tone), slightly translucid |

| | | |
|---|---|---|
| apple-green | 2614 | powder : very light grey<br>origin : Africa<br><br>production process:<br>3 g of agate + 40 ml nitric acid / soaking: 1 wk. / separation of the liquid and the solid / natural drying (colour of the liquid: pronounced greenish turquoise) / irradiated with electrons at 305,200 rad[73] |
| | | mineral : sardonyx<br>rock : white, slightly translucid (with a light orange-amber circular area on the surface)<br>powder : very light grey<br>origin : unkown<br><br>production process:<br>4 g of sardonyx + 40 ml hydrochloric acid / soaking: 14 d. / separation of the liquid and the solid / natural drying (colour of the liquid: light and vivid apple-green) / irradiated with electrons at: |
| apple-green | 2615 | 164,800 rad |
| ↓ | | |
| apple-green | 2616 | 305,200 rad[73] |
| apple-green | 2617 | mineral : agate<br>rock : grey (with a light orange circular area on the surface), slightly translucid<br>powder : very light grey<br>origin : unknown<br><br>production process:<br>3 g of agate + 40 ml nitric acid / soaking: 1 wk. / separation of the liquid and the solid / natural drying (colour of the liquid: medium greenish turquoise)/irradiated with electrons at 164,800 rad (followed at «light apple-green») |
| apple-green | 2618 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «orange [light green tone]»)<br>250 g of asbestos + 1650 ml hydrochloric acid in a becher of 2000 ml or asbestos entirely covered |

| | | |
|---|---|---|
| | | with hydrochloric acid in a vertical container / soaking: 1 wk. / drying on hot plate (formation of 3 superposed layers of colours) / colour of the layer at the bottom[438] |
| apple-green | 2618.1 | production process: 0↑1000 °F (grey [light beige tone]): 3 g + 25 ml hydrochloric acid / immediate drying on hot plate (orange): .3 g + 50 cc of transparent polyester resin + 1% of catalyst / manual grinding / moulding / deposited in a container which is hermetically closed with a cover and deposited in an oven used for plastics at 100 °F until it is hardened |
| apple-green | 2618.2 | production process: 3 g of asbestos + 5 ml hydrochloric acid + 20 ml water / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover and deposited in an oven used for plastics at 100 °F until it is hardened (followed at «beige» and «beige [orange tone]») |
| apple-green | 2618.3 | production process: 3 g of asbestos + 15 ml hydrochloric acid + 10 ml water / soaking: 5 d. / drying in an oven at 100 °F (yellow [orange tone]): .3 g + 50 cc of transparent polyester resin + 10 drops of catalyst / manual grinding / moulding / deposited in a container which is hermetically closed with a cover and deposited in an oven used for plastics at 100 °F until it is hardened |
| apple-green | 2618.4 | production process: 3 g of asbestos + 15 ml hydrochloric acid + 10 ml water / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover and deposited in an oven used for plastics at 100 °F until it is hardened |
| apple-green | 2618.5 | production process: 3 g of asbestos + 20 ml hydrochloric acid + 5 ml water / soaking: 5 d. / drying in an oven at 100 °F (yellow [orange tone]): .3 g + 50 cc of transparent polyester resin + 8 drops of catalyst / manual grinding / moulding / deposited in a con- |

| | | |
|---|---|---|
| | | tainer which is hermetically closed with a cover and deposited in an oven used for plastics at 100 °F until it is hardened |
| apple-green | 2618.6 | <u>production process:</u><br>3 g of asbestos + 25 ml hydrochloric acid / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover during the hardening |
| apple-green | 2618.7 | 3 g of asbestos + 20 ml hydrochloric acid + 5 ml water / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover during the hardening |
| apple-green | 2618.8 | 3 g of asbestos + 15 ml hydrochloric acid + 10 ml water / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover during the hardening |
| apple-green | 2618.9 | 3 g of asbestos + 10 ml hydrochloric acid + 15 ml water / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover during the hardening |
| apple-green | 2618.10 | 3 g of asbestos + 5 ml hydrochloric acid + 20 ml water / soaking: 5 d. / drying in an oven at 100 °F (yellow [orange tone]): .3 g + 50 cc of transparent polyester resin + 8 drops of catalyst / manual grinding / moulding / deposited in a container which is hermetically closed with a cover during the hardening[1269] |
| | | mineral : andulusite<br>rock : light brownish grey<br>powder : light grey<br>origin : Bimbowrie, South Australia |
| apple-green | 2619 | <u>production process:</u><br>.81 g of andulusite + 1.31 g of sodium carbonate / 1700 °F / 1 h[408] |

| | | |
|---|---|---|
| | | mineral : bornite<br>rock : reddish brown (with localized green and bluish green oxidation)<br>powder : reddish brown<br>origin : Lac Musset, Fosse du Labrador, Québec |
| apple-green | 2620 | production process:<br>(followed from «olive-green»)<br>2 g of bornite + 5 ml nitric acid + 20 ml hydrochloric acid / soaking: 6 d. / separation of the liquid and the solid / natural drying (colour of the liquid: light emerald-green[24]) / irradiated with electrons at 305,200 rad[73] |
| apple-green | 2621 | production process:<br>2 g of bornite + 10 ml nitric acid + 15 ml hydrochloric acid / soaking: 6 d. / separation of the liquid and the solid / natural drying (colour of the solid: mixture of particles: light phtalo[217a]-green / intense phtalo-green) / irradiated with electrons at 305,200 rad[73] |
| apple-green | 2622 | production process:<br>2 g of bornite + 15 ml nitric acid + 10 ml hydrochloric acid / soaking: 6 d. / separation of the liquid and the solid / natural drying (colour of the liquid: mixture of particles[404]: bluish green / light and vivid apple-green) / irradiated with electrons at 305,200 rad[73] |
| | | production process:<br>2 g of bornite + 20 ml nitric acid + 5 ml hydrochloric acid / soaking: 6 d. / separation of the liquid and the solid / natural drying (colour of the liquid: medium and very vivid emerald-green) / irradiated with electrons at: |
| apple-green<br>↓ | 2623 | 164,800 rad |
| apple-green | 2624 | 305,200 rad[73] |
| apple-green | 2625 | production process:<br>2 g of bornite + 20 ml nitric acid + 5 ml hydrochloric acid / soaking: 6 d. / separation of the liquid and the solid / natural drying (colour of the solid: mixture of particles: medium phtalo[217a]-green / intense greenish blue) / irradiated with electrons at 305,200 rad[46] |
| | | mineral : chalcocite<br>rock : dark iron-grey (with localized turquoise oxidation) |

| | | |
|---|---|---|
| | | powder : dark iron-grey<br>origin : Butte, Montana, United States |
| apple-green | 2626 | production process:<br>3 g of chalcocite + 20 ml of a solution of cyanide[255] / natural drying / colour of the liquid[258] |
| | | mineral : chromite<br>rock : blackish grey<br>powder : medium brownish grey<br>origin : Black Lake, near Thetford Mines, Québec |
| apple-green | 2627 | production process:<br>(followed from «olive-green lighter and more vivid than "dark olive-green"»)<br>2 g of chromite + 2 g of potassium carbonate / 0↑1800 °F<br>(followed at «vivid apple-green») |
| | | mineral : chrysocolla<br>rock : light greenish turquoise<br>powder : very light greenish turquoise<br>origin : Mexico |
| apple-green | 2628 | production process:<br>2 g of chrysocolla + 25 ml hydrochloric acid / natural drying / colour of the liquid[24,409] |
| | 2629 | mineral : galena<br>rock : dark grey, with metallic brilliance<br>powder : dark grey, with metallic brilliance<br>origin : Sullivan deposit, COMINCO Co., Co-Trail, British Columbia<br><br>mineral : sulphur<br>rock : brilliant yellow<br>powder : brilliant yellow<br>origin : unknown |
| apple-green | 2630 | production process:<br>2 g of galena + 2 g of sulphur / 1300 °F / 1 h |
| areas: apple-green / caramel-orange (yellow reflection) | 2630.1 | production process:<br>1 g of galena + 1 g of sulphur + 6.50 g of powdered glass (spruce pine batch) / manual grinding / deposited on a ceramic plate at the state of a biscuit / heated in a furnace 0↑1000 °C in ambient air / slow cooling in the furnace |
| | | mineral : galena |

| | | |
|---|---|---|
| | | rock : dark grey, with metallic brilliance<br>powder : dark grey, with metallic brilliance<br>origin : Trail, British Columbia<br><br>mineral : cement[1138]<br>powder : white<br><br><u>production process:</u> |
| apple-green / orange / yellow / grey<br>↓ | 2631 | 1 g of powdered galena + 27.40 g of cement + 13 cc of water / manual grinding / moulding / hardening / addition of 1 g of galena at the surface of the piece of dried cement / 0↑1700 °F[280] |
| apple-green / brown (grey tone) | 2632 | 1 g of powdered galena + 27.40 g of cement + 13 cc of water / manual grinding / moulding / hardening / addition of 2 g of galena at the surface of the piece of dried cement / 0↑1700 °F[280,414,415]<br>(followed at «2 areas: 1) orange / yellow; 2) dark apple-green / iron-grey / brown [orange tone]») |
| apple-green | 2633 | <u>production process:</u><br>(followed from «2 areas: 1) orange / yellow; 2) dark green / iron-grey / brown [orange tone]»)<br>1 g of powdered galena + 27.40 g of cement + 1 g of sodium carbonate + 13 cc of water / manual grinding / moulding / hardening / addition of 3 g of powdered galena at the surface of the piece of dried cement / 0↑1700 °F[280]<br>(followed at «very light greyish beige [green reflection]») |
| apple-green | 2634 | mineral : galena<br>rock : dark grey, with metallic brilliance<br>powder : dark grey, with metallic brilliance<br>origin : Trail, British Columbia<br><br><u>production process:</u><br>(followed from «grey / brown / green»)<br>1 g of galena + 1 g of sodium carbonate / grinded and distributed in the porcelain lids for crucibles / 0↑1400 °F[280,411]<br>(followed at «vivid caramel-orange [red tone]») |
| | | mineral : galena<br>rock : dark grey, with metallic brilliance<br>powder : dark grey, with metallic brilliance<br>origin : Trail, British Columbia<br><br>mineral : graphite<br>rock : dark grey, with metallic brilliance<br>powder : dark grey, with metallic brilliance<br>origin : Grenville, Québec<br><br>mineral : cement[1138] |

| | | |
|---|---|---|
| | | powder : white<br><br>production process: |
| apple-green | 2635 | 27.40 g of cement + 13 cc of water + 1 g of sodium carbonate + 1 g of graphite / manual grinding / moulding / hardening / addition at the surface of the piece of dried cement of 3 g of powdered galena / 0↑1700 °F[280,412]<br>(followed at «apple-green / orange [yellow tone]», at «green / brown» [goethite[106]], at «dark green / brown [orange tone] / iron-grey / yellow / orange» [asbestos[4]] and at «pinkish orange / yellow [orange tone] / light pink [orange tone]» [shale (formation of Sillery)[359]]) |
| | | mineral : galena<br>rock : dark grey, with metallic brilliance<br>powder : dark grey, with metallic brilliance<br>origin : Trail, British Columbia<br><br>mineral : bauxite[92]<br>powder : pinkish beige, mat<br>origin : Alcan Company, French Guyana<br><br>mineral : cement[1138]<br>powder : white<br><br>production process: |
| apple-green / orange (yellow tone) | 2636 | 27.40 g of cement + 5 g of bauxite + 13 cc of water / manual grinding / moulding / hardening / addition at the surface of the dried piece of cement of 3 g of galena / 0↑1700 °F[280,413]<br>(followed at «apple-green» [graphite[92]], at «green / brown» [goethite[106]], at «dark green / brown [orange tone] / iron-grey / yellow / orange» [asbestos[4]], «pinkish orange / yellow [orange tone] / light pink [orange tone]» [shale (formation of Sillery[359])]) |
| | | mineral : orpiment<br>rock : vivid yellow (orange tone)<br>powder : vivid yellow (orange tone)<br>origin : Nevada, United States<br><br>mineral : lapis lazuli<br>rock : dark ultramarine-blue<br>powder : pale ultramarine-blue<br>origin : Afghanistan<br><br>production process: |
| apple-green | 2636.1 | 1 g of orpiment + 1 g of lapis lazuli / grinding |
| | | mineral : uraninite<br>rock : medium chocolate-brown (red Bordeau |

| | | |
|---|---|---|
| | | tone)<br>powder : medium milky chocolate-brown<br>origin : Yellowknife, Canada |
| apple-green | 2637 | production process:<br>8 g of uraninite + 100 ml hydrochloric acid / soaking: 4 yrs. / formation of 4 superposed layers of colours, the two layers at the top being two liquids and the two layers at the bottom being solids / separation of the liquid and the solid / drying on hot plate (still humid) / colour of the 1st layer of colour at the surface, composing the two liquids[416] |
| | | mineral : fuel oil soot[86]<br>powder : profound brownish black<br>origin : boiler room of Laval University, city of Québec, Québec |
| apple-green | 2639 | production process:<br>2 g of soot+20 ml sulphuric acid / soaking: 24 h / deposited on a hot plate / brought to boiling point[345] / immediately after boiling, separation of the liquid and the solid / drying on hot plate (colour of the liquid[77]: grass-green [grey tone], cold and mat): 3 g + 50 cc of transparent polyester resin + 1% of catalyst / manual grinding / moulding / hardening (light greyish green) / irradiated with gamma rays at 5.7 Mrad |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |
| apple-green | 2640 | production process:<br>(followed from «vivid apple-green»)<br>20 g of iron sulphide - nickel + 100 ml hydrochloric acid / soaking: 3 mo. / drying on hot plate (followed at «very light apple-green» and «very vivid apple-green») |
| | | mineral : chrysocolla<br>rock : light greenish turquoise<br>powder : very light greenish turquoise<br>origin : Mexico |

| | | |
|---|---|---|
| apple-green more intense than «apple-green» | 2641 | <u>production process:</u><br>2 g of chrysocolla + 25 ml hydrochloric acid / natural drying (colour of the liquid[409]: apple-green[24]) / irradiated with gamma rays at 64.7 Mrad (followed at «light and fairly intense greenish turquoise») |
| apple-green much more intense than «apple-green» | 2642 | mineral : steatite<br>rock : light evergreen<br>powder : white<br>origin : East Broughton, Québec<br><br><u>production process:</u><br>2 g of steatite + 2 g of sodium carbonate / 0↑1700 °F + 45 min. at 1700 °F (green) / irradiated with gamma rays at 64.7 Mrad (followed at «yellowish green [orange reflection]») |
| apple-green darker than «apple-green» | 2643 | mineral : andulusite<br>rock : light brownish grey<br>powder : light grey<br>origin : Bimbowrie, South Australia<br><br><u>production process:</u><br>.81 g of andulusite + 1.31 g of sodium carbonate / 1700 °F / 1 h (apple-green) / irradiated with electrons at 305,200 rad[46] |
| apple-green [between «light apple-green» and «medium apple-green»] | 2644 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «greenish turquoise more pale than "medium greenish turquoise"»)<br>2 g of bornite + 20 ml nitric acid + 5 ml hydrochloric acid / soaking: 6 d. / separation of the liquid and the solid / natural drying (colour of the solid: mixture of particles: medium phtalo[217a]-green / intense greenish blue) / irradiated with gamma rays at 425.65 Mrad |
| medium apple-green | 2645 | mineral : chrysocolla<br>rock : light greenish turquoise<br>powder : very light greenish turquoise<br>origin : Mexico<br><br><u>production process:</u><br>powder irradiated with gamma rays at 424.7 Mrad[418] |

| | | |
|---|---|---|
| medium apple-green | 2646 | mineral : malachite<br>rock : ribboned variety of accentuated mint-green<br>powder : light and brilliant mint-green<br>origin : Katanga province, at 300 km from Lubumbachai, Zaïr, Africa<br><br>production process:<br>(followed from «greenish blue much more intense than "intense greenish blue"»)<br>2 g of malachite + 20 ml sulphuric acid / natural drying (intense indigo-blue) / irradiated with gamma rays at 424.7 Mrad |
| medium apple-green | 2647 | mineral : amazon stone<br>rock : light greenish turquoise, translucid<br>powder : white (turquoise reflection)<br>origin : unknown<br><br>production process:<br>4 g of amazon stone + 40 ml hydrochloric acid / soaking: 1 wk. / separation of the liquid and the solid / natural drying / colour of the liquid[160] |
| medium apple-green, fairly vivid | 2648 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 20 ml nitric acid + 5 ml hydrochloric acid / soaking: 6 d. / separation of the liquid and the solid / natural drying (colour of the liquid: medium and very vivid emerald-blue) / irradiated with gamma rays at 425.65 Mrad |
| medium and intense apple-green | 2649 | mineral : chalcocite<br>rock : dark iron-grey (with localized turquoise oxidation)<br>powder : dark iron-grey<br>origin : Butte, Montana, United States<br><br>production process:<br>(followed from «intense olive-green»)<br>4 g of chalcocite + 100 ml nitric acid / soaking: 2 wk. / separation of the liquid (1st) and the solid / desiccation of the 1st liquid (colour of the 1st liquid: very intense emerald-green) / addition to the same solid of 100 ml nitric acid / soaking: 2 wk. / separation of the liquid (2nd) and the solid / desiccation of the 2nd liquid (mixture of |

443

| | | |
|---|---|---|
| | | particles: acute greenish turquoise / very vivid blue) / natural drying of the solid / the 2nd liquid is irradiated with gamma rays at 424.7 Mrad[239] |
| medium and intense apple-green | 2650 | mineral : obsidian<br>rock : very dark smoky grey, almost black<br>powder : light grey<br>origin : Arkansas, United States<br><br>production process:<br>2 g of obsidian + 20 ml hydrochloric acid / soaking: 3 d. / drying on hot plate (white): .3 g + 50 cc of transparent polyester resin + 1% of catalyst / manual grinding / moulding / hardening (medium cold mint-green) / irradiated with gamma rays at 5.7 Mrad |
| apple-green a bit more accentuated than «medium apple-green» | 2651 | mineral : amazon stone<br>rock : light greenish turquoise, translucid<br>powder : white (turquoise reflection)<br>origin : unknown<br><br>production process:<br>4 g of amazon stone + 40 ml hydrochloric acid / soaking: 1 wk. / separation of the liquid and the solid / natural drying (colour of the liquid: medium apple green) / irradiated with electrons at 164,800 rad<br>(followed at «mixture of particles: beige [green tone] / cream [yellow tone]») |
| apple-green lighter and a bit colder than «vivid apple-green» | 2652 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «vivid apple-green»)<br>0↑700 °F (grey lighter than «light grey»): 5 g + 25 ml hydrochloric acid / soaking: 3 d. / drying on hot plate[426]<br>(followed at «green [yellow tone]») |
| | | mineral : bloody agate<br>rock : dark grass-green, slightly translucid |

| | | |
|---|---|---|
| vivid apple-green | 2653 | powder : light grey (light green tone)<br>origin : India<br><br><u>production process</u>:<br>8 g of agate + 40 ml hydrochloric acid / soaking: 1 wk. / separation of the liquid and the solid / natural drying / colour of the solid[396] |
| vivid apple-green | 2654 | mineral : asbestos[4]<br>rock : dark grey (green reflection)<br>powder : light grey (green reflection)<br>origin : Asbestos Corporation Ltd., Thetford Mines, Québec<br><br><u>production process</u>:<br>50 g of asbestos + 200 ml hydrochloric acid <u>or</u> asbestos covered with hydrochloric acid / soaking: 1 wk. / drying on hot plate (vivid yellow): .50 g + .50 g of sodium carbonate (light and vivid orange [beige tone]) + 40 ml hydrochloric acid / soaking: 5 d. / separation of the liquid and the solid / drying on sand bath / colour of the liquid[396a] |
| vivid apple-green | 2655 | mineral : anorthosite<br>rock : dark grey<br>powder : medium grey<br>origin : Jonquière, Lac Saint-Jean, Québec<br><br><u>production process</u>:<br>2 g of anorthosite + 2 g of sodium carbonate / 0↑1600 °F + 1 h at 1600 °F (intense mint-green) / irradiated with electrons at 302,831 rad[36] |
| vivid apple-green | 2656 | mineral : bornite<br>rock : reddish brown (with localized green and bluish green oxidation)<br>powder : reddish brown<br>origin : Lac Musset, Fosse du Labrador, Québec<br><br><u>production process</u>:<br>(followed from «vivid apple-green»)<br>12 g of bornite + 40 ml hydrochloric acid / soaking: 3 d. / separation of the liquid and the solid / natural drying (colour of the 1st liquid: very dense and vivid apple-green) / addition of 100 ml hydrochloric acid to the same solid / soaking: 3 d. / separation of the liquid and the solid / drying on sand bath / colour of the 2nd liquid<br>(followed at «pale greyish green») |

| | | |
|---|---|---|
| vivid apple-green | 2657 | production process:<br>12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath (colour of the 2nd liquid: very saturated and vivid blue) / the 2nd liquid is irradiated with gamma rays at 64.7 Mrad<br>(followed at «mixture of particles: beige [green tone] / brown») |
| vivid apple-green | 2658 | mineral : chalcopyrite<br>rock : brass-yellow, with metallic luster<br>powder : dark grey (with golden particles)<br>origin : Noranda Mines, Noranda, Abitibi, Québec<br><br>production process:<br>5 g of chalcopyrite + 20 ml nitric acid / soaking: 15 h / separation of the liquid and the solid / natural drying / colour of the 1st liquid<br>(followed at «apple-green [yellow tone]» and «pale apple-green») |
| vivid apple-green | 2659 | production process:<br>rock irradiated with gamma rays at 65 Mrad / grinding: 1 g of powder + 40 ml nitric acid / natural drying / colour of the solid[421]<br>(followed at «intense phtalo-green») |
| vivid apple-green | 2660 | mineral : chromite<br>rock : blackish grey<br>powder : medium brownish grey<br>origin : Black Lake, near Thetford Mines, Québec<br><br>production process:<br>(followed from «apple-green»)<br>1 g of chromite + 2 g of potassium carbonate / 0↑1800 °F[422] |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |

| | | |
|---|---|---|
| vivid apple-green | 2661 | production process:<br>5 g of iron sulphide - nickel + 25 ml hydrochloric acid / soaking: 4 d. / drying on hot plate |
| lighter apple-green | 2662 | 5 g of iron sulphide - nickel + 20 ml hydrochloric acid + 5 ml nitric acid / soaking: 4 d. / drying on hot plate |
| apple-green still more light | 2663 | 5 g of iron sulphide - nickel + 15 ml hydrochloric acid + 10 ml nitric acid / soaking: 4 d. / drying on hot plate |
| apple-green much more light | 2664 | 5 g of iron sulphide - nickel + 10 ml hydrochloric acid + 15 ml nitric acid / soaking: 4 d. / drying on hot plate |
| ↓ apple-green still more light | 2665 | 5 g of iron sulphide - nickel + 5 ml hydrochloric acid + 20 ml nitric acid / soaking: 4 d. / drying on hot plate[424] |
| vivid apple-green | 2666 | production process:<br>5 g of iron sulphide - nickel + 25 ml hydrochloric acid / soaking: 3 d. / drying on hot plate[423,425]<br>(followed at «very light apple-green», at «apple-green», at «very vivid apple-green» and «apple-green lighter and a bit colder than "vivid apple-green"») |
| apple-green less vivid than «vivid apple-green» | 2667 | 5 g of iron sulphide - nickel + 20 ml hydrochloric acid + 5 ml water / soaking: 3 d. / drying on hot plate |
| apple-green still less vivid | 2668 | 5 g of iron sulphide - nickel + 15 ml hydrochloric acid + 10 ml water / soaking: 3 d. / drying on hot plate |
| apple-green still less vivid | 2669 | 5 g of iron sulphide - nickel + 10 ml hydrochloric acid + 15 ml water / soaking: 3 d. / drying on hot plate |
| ↓ apple-green still less vivid | 2670 | 5 g of iron sulphide - nickel + 5 ml hydrochloric acid + 20 ml water / soaking: 3 d. / drying on hot plate |
| apple-green more vivid than «vivid apple-green» | 2671 | production process:<br>(followed from «green [light yellow tone]»)<br>5 g of iron sulphide - nickel + 20 ml hydrochloric acid + 5 ml water / immediate drying on hot plate |

| | | |
|---|---|---|
| less vivid apple-green ↓ | 2672 | 5 g of iron sulphide - nickel + 15 ml hydrochloric acid + 10 ml water / immediate drying on hot plate |
| still less vivid apple-green ↓ | 2673 | 5 g of iron sulphide - nickel + 10 l hydrochloric acid + 15 ml water / immediate drying on hot plate |
| still less vivid apple-green | 2674 | 5 g of iron sulphide - nickel + 5 ml hydrochloric acid + 20 ml water / immediate drying on hot plate |
| apple-green more accentuated than «vivid apple-green» | 2675 | mineral : bloody agate<br>rock : dark grass-green, slightly translucid<br>powder : light grey (light green tone)<br>origin : India<br><br>production process:<br>8 g of agate + 40 ml hydrochloric acid / soaking: 1 wk. / separation of the liquid and the solid / natural drying (colour of the solid: vivid apple-green) / irradiated with electrons at 164,800 rad (followed at «dark olive-green») |
| apple-green more light, luminous and vivid than «very vivid apple-green» | 2676 | mineral : industrial pigment[393]<br>powder : very vivid apple green<br>origin : unknown<br><br>production process:<br>irradiated with electrons at 305,200 rad[73] |
| very saturated and vivid apple-green | 2677 | mineral : bornite<br>rock : reddish brown (with localized green and bluish green oxidation)<br>powder : reddish brown<br>origin : Lac Musset, Fosse du Labrador, Québec<br><br>production process:<br>12 g of bornite + 40 ml hydrochloric acid / soaking: 3 d. / separation of the liquid and the solid / natural drying / colour of the 1st liquid[428] (followed at «vivid apple-green» and «pale greyish green») |
| | | mineral : olivine<br>rock : light grey, cristalline<br>powder : very light grey |

| | | |
|---|---|---|
| very vivid apple-green | 2678 | origin : Mont Albert, Gaspésie, Québec<br><br>production process:<br>4 g of olivine + 50 ml hydrochloric acid / soaking: 2 wk. / drying on hot plate |
| very intense apple-green (acute green tone) | 2679 | mineral : nickel sulphide<br>rock : dark grey<br>powder : dark grey<br>origin : Sudbury, Ontario<br><br>production process:<br>4 g of nickel sulphide + 25 ml hydrochloric acid / boiling reaction as soon as the solid is put in the acid / immediately after this reaction, separation of the liquid and the solid /natural drying colour of the liquid[7,24,429] |
| apple-green much more accentuated and luminous than «vivid apple-green» | 2680 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>5 g of iron sulphide - nickel + 25 ml hydrochloric acid / soaking: 3 d. / drying on hot plate (vivid apple-green) / irradiated with gamma rays at 64.7 Mrad[239]<br>(followed at «medium brown [reddish orange tone], accentuated and dark») |
| very vivid apple-green | 2681 | production process:<br>(followed from «vivid apple-green»)<br>20 g of iron sulphide - nickel + 100 ml hydrochloric acid / soaking: 5 mo. / natural drying<br>(followed at «apple-green» and «very light apple-green») |
| very, very vivid | 2682 | mineral : bornite<br>rock : reddish brown (with localized green and bluish green oxidation)<br>powder : reddish brown<br>origin : Lac Musset, Fosse du Labrador, Québec<br><br>production process:<br>(followed from «intense emerald-green» and «light and acute phtalo-green»)<br>3 g of bornite + 50 ml hydrochloric acid / soa- |

| | | |
|---|---|---|
| apple-green | | king: 6 d. / separation of the liquid and the solid / natural drying / colour of the liquid[350] (followed at «very vivid canary-yellow») |
| | | mineral : anorthosite<br>rock : light grey<br>powder : very, very light greyish beige<br>origin : rang Sainte-Germaine, Oka, Québec<br><br>production process: |
| dark apple-green | 2683 | rock irradiated with gamma rays at 65 Mrad / grinding: .76 g of irradiated powder + 1.26 g of sodium carbonate / 1700 °F / 1 h[431] |
| | | mineral : chromite<br>rock : blackish grey<br>powder : medium brownish grey<br>origin : Black Lake, near Thetford Mines, Québec<br><br>production process:<br>(followed from «intense yellowish green»)<br>2 g of chromite + 2 g of sodium carbonate: |
| dark apple-green | 2684 | 0↑1800 °F + 1 h at 1800 °F |
| dark apple-green | 2685 | 0↑1900 °F + 15 min. at 1900 °F |
| | | (followed at «dark and intense apple-green [light grey tone]»)<br>(followed from «apple-green [yellow tone]») |
| apple-green still darker | 2686 | 0↑1900 °F + 1:45 h at 1900 °F |
| ↓ | | |
| apple-green still darker than «dark apple-green» | 2687 | 0↑1900 °F + 2 h at 1900 °F |
| | | mineral : biotite gneiss<br>rock : blackish grey, golden vitreous brilliance<br>powder : dark grey<br>origin : Grenville geological province, Québec<br><br>production process: |
| dark apple-green | 2688 | 1 g of gneiss + 2 g of sodium carbonate / 1500 °F / 1 h |
| ↓ | | |
| dark apple-green | 2689 | 1 g of gneiss + 2 g of sodium carbonate / 1600 °F / 1 h |

| | | |
|---|---|---|
| dark apple-green<br>↓<br>dark apple-green | 2690<br><br>2691 | <u>production process:</u><br>1 g of gneiss + 3 g of sodium carbonate / 1500 °F / 1 h<br><br>1 g of gneiss + 3 g of sodium carbonate / 1600 °F / 1 h |
| dark apple-green | 2692 | mineral : tremolite<br>rock : medium brown (evergreen tone)<br>powder : greyish beige<br>origin : Tetreault Mine, Montauban, Portneuf county, Québec<br><br><u>production process:</u><br>(followed from «greenish turquoise»)<br>irradiated with gamma rays at 65 Mrad: .25 g of powder + 1.25 g of sodium carbonate / 1700 °F / 1 h[432] |
| mixture of particles | | |
| very pale apple-green / pale beige | 2693 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br><u>production process:</u><br>(followed from «pale apple-green»)<br>2 g of silica + 2 g of sodium carbonate / 0↑1800 °F + 1 h at 1800 °F (apple-green a bit darker than «light apple-green») / irradiated with electrons at 302,831 rad[45] |
| pale apple-green / pale pink<br>↓<br>very light apple-green / light pinkish beige | 2694<br><br>2695 | mineral : vesuvianite<br>rock : lilac<br>powder : lilac<br>origin : John Mansville Mine, Asbestos, Québec<br><br><u>production process:</u><br>12 g of vesuvianite + 40 ml nitric acid / soaking: 1 wk. / drying on sand bath (light and vivid pink [violet tone]) / irradiated with gamma rays at:<br>63.88 Mrad[587]<br><br>423.88 Mrad |

| | | |
|---|---|---|
| | | mineral : chalcopyrite<br>rock : brass-yellow, with metallic luster<br>powder : dark grey (with golden particles)<br>origin : Noranda Mines, Noranda, Abitibi, Québec<br><br>production process:<br>5 g of chalcopyrite + 20 ml sulphuric acid / soaking: 3 d. / drying on hot plate (light mint-green) / irradiated with electrons at 302,831 rad[45] |
| light apple-green / medium sulphur yellow | 2696 | |
| | | mineral : chalcocite<br>rock : dark iron-grey (with localized turquoise oxidation)<br>powder : dark iron-grey<br>origin : Butte, Montana, United States<br><br>production process:<br>powder irradiated with electrons at 302,831 rad[36] |
| apple-green / grey / beige | 2697 | |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>5 g of iron sulphide - nickel + 20 ml hydrofluoric acid / soaking: 24 h / drying in oven at 100 °F |
| apple-green / green (grey tone) | 2698 | |
| | | mineral : copper concentrate (Cu-FeS)<br>powder : medium chocolate-brown (grey tone)<br>origin : Centre de recherche des Mines Noranda in Montréal, Québec<br><br>production process:<br>4 g of concentrate + 50 ml nitric acid / soaking: 4 wk. / separation of the liquid and the solid / drying on sand bath (colour of the solid: light green [light blue tone]) / irradiated with electrons at 302,831 rad[36] |
| apple-green fairly pronounced / creamy yellow fairly pronounced | 2699 | |
| | | mineral : biotite gneiss<br>rock : blackish grey, golden vitreous brilliance<br>powder : dark grey<br>origin : Grenville geological province, Québec |

| | | |
|---|---|---|
| dark apple-green / dark reddish brown | 2700 | production process:<br>1 g of gneiss + 1 g of sodium carbonate / 1600 °F / 1 h |
| apple-green (yellow tone) | | |
| apple-green (yellow tone) a bit more pale than «light apple-green (yellow tone)» | 2701 | mineral : chalcopyrite<br>powder : dark grey (light green tone)<br>origin : Centre de recherche des Mines Noranda in Montréal, Québec<br><br>production process:<br>4 g of chalcopyrite + 50 ml nitric acid / boiling reaction when the solid is put in the acid / immediately after the reaction, separation of the liquid and the solid / the 2 rest separately during 1 wk. / natural drying (colour of the liquid: light apple-green [orange tone]) / irradiated with gamma[239] rays at 64.7 Mrad<br>(followed at «apple-green [light orange tone]») |
| light apple-green (yellow tone) | 2702 | mineral : chrysocolla<br>rock : light greenish turquoise<br>powder : very light greenish turquoise<br>origin : Mexico<br><br>production process:<br>1 g of chrysocolla + 4 ml ammonia / natural drying (bluish green): .2 g + 50 cc of transparent polyester resin + 1% of catalyst / manual grinding / moulding / hardening (light mint-green) / irradiated with gamma rays at 11.4 Mrad |
| light apple-green (localized yellow reflection) | 2703 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «pale apple-green / pale yellow [orange tone]»)<br>.45 g of powdered galena + .45 g of sulphur / deposited on a piece of glass measuring 1" x 1" x 1/8" / 0↑1500 °F / slow cooling in furnace[280]<br>(followed at «medium orange [brown tone]») |

| | | |
|---|---|---|
| light apple-green (light honey yellow tone) | 2704 | mineral : beryl<br>rock : light blue, slightly translucid<br>powder : light grey<br>origin : Abitibi, Québec<br><br>production process:<br>powder irradiated with gamma rays at 244.53 Mrad[433]<br>(followed at «medium and mat apple-green [yellow tone]») |
| apple-green (light yellow tone) more intense than «light apple-green (yellow tone)»<br>↓<br>apple-green (yellow tone more accentuated) | 2705<br><br>2706 | mineral : beryl<br>rock : light blue (near turquoise), slightly translucid<br>powder : light grey<br>origin : Lacorne district, Abitibi, Québec<br><br>production process:<br>(followed from «apple-green more intense than "light apple-green"»)<br>rock irradiated with gamma rays at:<br>148.4 Mrad<br><br>201.6 Mrad<br>(followed at «accentuated olive-green [yellow tone]») |
| apple-green (yellow tone) a bit more pale than «apple-green (yellow tone)» | 2706.1 | mineral : malachite<br>rock : ribboned variety of accentuated mint-green<br>powder : light and brilliant mint-green<br>origin : Katanga province, at 300 km from Lubumbachai, Zair, Africa<br><br>mineral : orpiment<br>rock : vivid yellow (orange tone)<br>powder : vivid yellow (orange tone)<br>origin : Nevada, United States<br><br>mineral : zirconium oxide<br>powder : light beige<br>origin : Tam Ceramic Inc., Montréal, Québec<br><br>production process:<br>0.14061 g of malachite irradiated with gamma rays at 2.26 Mrad + 0.14061 g of orpiment irradiated with gamma rays at 2.26 Mrad + 0.14061 of zirconium oxide / grinding |

| | | |
|---|---|---|
| | | mineral : malachite<br>rock : ribboned variety of accentuated mint-green<br>powder : light and brilliant mint-green<br>origin : Katanga province, at 300 km from Lubumbachai, Zaïr, Africa<br><br>mineral : orpiment<br>rock : vivid yellow (orange tone)<br>powder : vivid yellow (orange tone)<br>origin : Nevada, United States<br><br>production process:<br>0.14061 g of malachite irradiated with gamma rays at 2.26 Mrad + 0.14061 g of orpiment irradiated with gamma rays at 2.26 Mrad + 0.28122 g of sodium carbonate / grinding |
| apple-green (yellow tone) a bit more pale than «apple-green (yellow tone)» | 2706.2 | |
| apple-green (yellow tone) | 2706.3 | production process:<br>0.14061 g of malachite irradiated with gamma rays at 2.26 Mrad + 0.14061 g of orpiment irradiated with gamma rays at 2.26 Mrad / grinding |
| apple-green (yellow tone) | 2707 | mineral : copper<br>rock : reddish brown, with metallic luster<br>powder : reddish brown, with metallic luster<br>origin : unknown<br><br>production process:<br>rock entirely covered with 1000 ml acetic acid / natural drying / removal of the crystals formed at the surface of the rock (colour of the crystals: pronounced emerald-green): 5 g of crystals + 25 ml ammonia / natural drying (very intense blue [violet tone]): 1 g + 1 cc of transparent printing ink / manual grinding / 1 impression on white glazed paper [following the printing of a first copy produced by making 16 superimpositions] (light apple green) / irradiated with gamma rays at 22.8 Mrad[434] |
| apple-green | 2708 | mineral : chalcopyrite<br>rock : brass-yellow, with metallic luster<br>powder : dark grey (with golden particles)<br>origin : Noranda Mines, Noranda, Abitibi, Québec<br><br>production process:<br>(followed from «vivid apple-green» and «pale apple-green»)<br>5 g of chalcopyrite + 20 ml nitric acid / soaking: |

| | | |
|---|---|---|
| (yellow tone) | | 15 h / separation of the liquid and the solid / natural drying (colour of the 1st liquid: vivid apple-green) / colour of the matter deposited at the bottom of the 1st liquid: pale apple-green) / addition to the same solid of 20 ml nitric acid / soaking: 3 d. / natural drying / colour of the 2nd liquid[350,435] (followed at «yellow [near "orange"]») |
| | | mineral : chromite<br>rock : blackish grey<br>powder : medium brownish grey<br>origin : Black Lake, near Thetford Mines, Québec<br><br>production process:<br>(followed from «dark and intense apple-green [light grey tone]»)<br>2 g of chromite + 2 g of sodium carbonate: |
| apple-green (yellow tone) more intense than «dark apple-green (yellow tone)» ↓ | 2709 | 0↑1900 °F + 45 min. at 1900 °F |
| apple-green (yellow tone) still darker ↓ | 2710 | 0↑1900 °F + 1 h at 1900 °F |
| apple-green (yellow tone) still darker ↓ | 2711 | 0↑1900 °F + 1:15 h at 1900 °F |
| apple-green (yellow tone) lighter and more vivid | 2712 | 0↑1900 °F + 1:30 h at 1900 °F (followed at «apple-green darker than "dark apple-green"») |
| | | mineral : sulphur<br>rock : brilliant yellow<br>powder : brilliant yellow<br>origin : unknown<br><br>production process: |
| apple-green (yellow tone) | 2713 | 1 g of sulphur + 1 g of sodium carbonate / 0↑1700 °F (light greenish yellow) / irradiated with gamma rays at 63.88 Mrad[46] (followed at «greenish yellow a bit more dark than "light greenish yellow"») |
| | | mineral : iron sulphide - nickel[353]<br>rock : medium greyish green<br>powder : light grey (light green tone)<br>origin : small copper and nickel deposit, in the South-Western area of a mass of |

| | | |
|---|---|---|
| | | serpentinite at 3 km at the West of Saint-Fabien-de-Panet, Québec<br><br>(followed from «apple-green a bit more intense than "light apple-green"»)<br>0↑800 °F (grey lighter than «light grey»): 5 g + 25 ml nitric acid / soaking: 3 d. / drying on hot plate<br>(followed at «khaki-green [between "orange" and "green"»)|
| apple-green (light yellow tone) | 2714 | |
| medium and mat apple-green (yellow tone) | 2715 | mineral : beryl<br>rock : light bleu, slightly translucid<br>powder : light grey<br>origin : Abitibi, Québec<br><br><u>production process:</u><br>(followed from «light apple-green [light honey-yellow tone]»)<br>powder irradiated with gamma rays at 604.53 Mrad |
| medium apple-green (yellow tone) | 2716 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «phtalo[217a]-green more pale than "vivid phtalo-green"»)<br>2 g of bornite + 10 ml nitric acid + 15 ml hydrochloric acid / soaking: 6 d. / separation of the liquid and the solid / natural drying (colour of the liquid: vivid phtalo[217a]-green) / irradiated with gamma rays at 425.65 Mrad |
| very vivid apple-green (light yellow tone) | 2717 | mineral : industrial pigment[393]<br>powder : very vivid apple-green<br>origin : unknown<br><br><u>production process:</u><br>irradiated with gamma rays at 602.804 Mrad |
| apple-green (yellow tone and orange reflection) | | |

| | | |
|---|---|---|
| apple-green (yellow tone [orange reflection]) | 2718 | mineral : bornite<br>rock : reddish brown (with localized green and bluish green oxidation)<br>powder : reddish brown<br>origin : Lac Musset, Fosse du Labrador, Québec<br><br>production process:<br>(followed from «phtalo[217]-green [light mint-green tone]»)<br>2 g of bornite + 25 ml nitric acid / soaking: 6 d. / separation of the liquid and the solid / natural drying (colour of the solid: mossy green) / irradiated with gamma rays at 425.65 Mrad[437] |
| apple-green (orange tone) | | |
| light apple-green (orange tone) | 2719 | mineral : chalcopyrite<br>powder : dark grey (light green tone)<br>origin : Centre de recherche des Mines Noranda in Montréal, Québec<br><br>production process:<br>4 g of chalcopyrite + 50 ml nitric acid / boiling reaction when the mineral is put in the acid / immediately after boiling reaction, separation of the liquid and the solid / the 2 rest separately during 1 wk. / natural drying / colour of the liquid[38]<br>(followed at «light chocolate-brown») |
| apple-green (light orange tone) a bit more intense and dark [brown] than «light apple-green (orange tone)» | 2720 | production process:<br>(followed from «apple-green [yellow tone] a bit more pale than "light apple-green [yellow tone]"»)<br>4 g of chalcopyrite + 50 ml nitric acid / boiling reaction when the mineral is deposited in the acid / immediately after boiling reaction, separation of the liquid and solid / the 2 rest separately during 1 wk. / natural drying (colour of the liquid: light apple-green [orange tone]) / irradiated with gamma[239] rays at 424.7 Mrad |
| apple-green (orange tone) | 2721 | mineral : Gaspé agate<br>rock : marbled nodule with shaded tints of white, pink and grey, slightly translucid<br>powder : very light pinkish grey<br>origin : Mont Lyall, Gaspésie, Québec<br><br>production process:<br>4 g of agate + 40 ml hydrochloric acid / soaking: 1 wk. / separation of the liquid and the solid / natural drying / colour of the liquid[64] |
| | | mineral : anorthosite |

| | | |
|---|---|---|
| apple-green (light orange tone) | 2722 | rock : dark grey<br>powder : medium grey<br>origin : Jonquière, Lac Saint-Jean, Québec<br><br>production process:<br>2 g of anorthosite + 2 g of sodium carbonate / 0↑1600 °F + 1 h at 1600 °F (intense mint-green) / irradiated with gamma rays at 190.22 Mrad (followed at «light grass-green [grey tone]») |
| apple-green (beige tone) | | |
| pale apple-green (creamy beige tone) ↓ | 2722.1 | mineral : anorthosite<br>rock : dark grey<br>powder : medium grey<br>origin : Jonquière, Lac Saint-Jean, Québec<br><br>production process:<br>(followed from «creamy beige [apple-green tone]»)<br>20 g of bauxite + 20 g of caustic soda / 0↑1065 °C |
| apple-green a bit more accentuated (creamy beige reflection) ↓ | 2722.2 | 20 g of bauxite + 20 g of caustic soda / 0↑1085 °C |
| apple-green still a bit more accentuated (creamy reflection) ↓ | 2722.3 | 20 g of bauxite + 20 g of caustic soda / 0↑1090 °C |
| apple-green still a bit more accentuated (creamy reflection) ↓ | 2722.4 | 20 g of bauxite + 20 g of caustic soda / 0↑1093 °C |
| apple-green still more accentuated (light creamy reflection) | 2722.5 | 20 g of bauxite + 20 g of caustic soda / 0↑1100 °C |
| apple-green (brown tone) | | |
| apple-green (brown tone) | 2723 | mineral : andulusite<br>rock : light brownish grey<br>powder : light grey<br>origin : Bimbowrie, South Australia<br><br>production process:<br>2 g of andulusite + 2 g of sodium carbonate / 0↑1500 °F + 15 min. at 1500 °F (light apple-green) |

| | | |
|---|---|---|
| darker than «light apple-green (brown tone)» | | / irradiated with gamma rays at 64.7 Mrad<br><br>(followed at «dark yellow [beige tone]») |
| apple-green (grey tone) | | |
| pale apple-green (light grey tone)<br>↓<br>pale apple-green (light grey tone) | 2724<br><br>2725 | mineral : steatite<br>rock : light evergreen<br>powder : white<br>origin : East Broughton, Québec<br><br>production process:<br>2 g of steatite + 2 g of sodium carbonate / / 0↑1700 °F + 45 min. at 1700 °F (green) / irradiated with electrons at:<br>162,431 rad<br><br>302,831 rad[45] |
| medium apple-green (grey tone) | 2726 | mineral : bornite<br>rock : reddish brown (with localized green and bluish green oxidation)<br>powder : reddish brown<br>origin : Lac Musset, Fosse du Labrador, Québec<br><br>production process:<br>(followed from «light azure-blue»)<br>1 g of bornite + 10 ml nitric acid / soaking: 6 d. / separation of the liquid and the solid / natural drying / colour of the solid[52]<br>(followed at «pale apple-green») |
| dark and intense apple-green (light grey tone) | 2727 | mineral : chromite<br>rock : blackish grey<br>powder : medium brownish grey<br>origin : Black Lake, near Thetford Mines, Québec<br><br>production process:<br>(followed from «dark apple-green»)<br>2 g of chromite + 2 g of sodium carbonate / / 0↑1900 °F + 30 min. at 1900 °F<br>(followed at «apple-green [yellow tone]») |
| green [between «apple-green» and «mint-green»] | | |
| | | mineral : anorthosite<br>rock : dark grey<br>powder : medium grey<br>origin : Jonquière, Lac Saint-Jean, Québec |

| | | |
|---|---|---|
| green [between «apple-green» and «mint-green»] | 2728 | production process:<br>(followed from «apple-green more accentuated than "light apple-green"»)<br>2 g of anorthosite + 2 g of sodium carbonate / 0↑1500 °F + 1 h at 1500 °F<br>(followed at «intense mint-green») |
| green [between «apple-green» and «Paris green »] | | |
| green [between «apple-green» and «Paris green »] | 2729 | mineral : bauxite[92]<br>powder : mat pinkish beige<br>origin : Alcan Company, French Guyana<br><br>production process:<br>(followed from «orange [beige tone]»)<br>2 g of bauxite + 2 g of sodium carbonate / 0↑1500 °F + 40 min. at 1500 °F<br>(followed at «orange darker than "orange"») |
| yellowish green | | |
| pale green (light yellow tone) | 2730 | mineral : beryl<br>rock : light blue, slightly translucid<br>powder : light grey<br>origin : Abitibi, Québec<br><br>production process:<br>(followed from «light beige»)<br>2 g of beryl + 20 ml hydrofluoric acid / soaking: 24 h / drying in an oven at 100 °F (mixture of particles: light blue / light beige): .3 g + 50 cc of transparent polyester resin + 1% of catalyst / manual grinding / moulding / hardening (cold and light greenish grey) / irradiated with electrons at 305,082 rad[354] |
| very, very light yellowish green | 2730.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>grinding until fine powder / 0↑1300 °F + 4 h at 1300 °F (yellow more accentuated than «light yellow»): 1 g + 5 g of pyrex / manual grinding / heating: 5 °C per minute from 0↑1245 °C + maintenance during 1 h / cooling: 5 °C per minute until ambient temperature is reached / the entity is done |

| | | |
|---|---|---|
| | | in ambient air |
| very light yellowish green | 2731 | mineral : bornite<br>rock : reddish brown (with localized green and bluish green oxidation)<br>powder : reddish brown<br>origin : Lac Masset, Fosse du Labrador, Québec<br><br>production process:<br>(followed from «light yellowish green» and «light emerald-green»)<br>2 g of bornite + 20 ml hydrochloric acid + 5 ml nitric acid / soaking: 6 d. / separation of the liquid and the solid / natural drying / colour of the solid[55]<br>(followed at «mixture of particles: light phtalo-green / intense phtalo-green») |
| very light yellowish green | 2732 | mineral : amazonite<br>rock : greenish turquoise<br>powder : white (turquoise reflection)<br>origin : Lac Saint-Jean, Québec<br><br>production process:<br>2 g of amazonite + 20 ml hydrochloric acid / soaking: 3 d. / drying on hot plate |
| yellowish green very slightly more accentuated than «very light yellowish green» | 2733 | production process:<br>2 g of amazonite + 20 ml hydrochloric acid / soaking: 3 d. / drying on hot plate (very light yellowish green) / irradiated with electrons at 162,431 rad<br>(followed at «very light bluish turquoise») |
| yellowish green much more accentuated than «very light yellowish green» | 2734 | production process:<br>2 g of amazonite + 20 ml hydrochloric acid / soaking: 3 d. / drying on hot plate (very light yellowish green) / irradiated with gamma rays at 64.7 Mrad<br>(followed at «greenish beige») |
| yellowish green much darker than «very light yellowish green» | 2735 | mineral : fluorescent calcite<br>rock : white (localized grey or brown reflection), translucid<br>powder : white (yellow reflection)<br>origin : Bancroft, Ontario<br><br>production process:<br>(followed from «light greyish beige or light grey [beige tone]»)<br>.3 g of calcite + 50 cc of transparent polyester resin + 1% of catalyst / manual grinding / moulding / hardening (very light grey [light yellow reflection]) / irradiated with electrons at |

| | | |
|---|---|---|
| | | 305,082 rad[354] |
| light yellowish green | 2736 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process</u>:<br>50 g of asbestos + 200 ml hydrochloric acid <u>or</u> asbestos entirely covered with hydrochloric acid / soaking: 1 wk. / drying on hot plate (vivid yellow): .50 g + .50 g of sulphur/grinding |
| light yellowish green | 2737 | mineral : beryl<br>rock : light blue, slightly translucid<br>powder : light grey<br>origin : Abitibi, Québec<br><br><u>production process</u>:<br>2 g of beryl + 25 ml hydrochloric acid / soaking: 24 h / drying on hot plate |
| light yellowish green | 2738 | mineral : bornite<br>rock : reddish brown (with localized green and bluish green oxidation)<br>powder : reddish brown<br>origin : Lac Musset, Fosse du Labrador, Québec<br><br><u>production process</u>:<br>(followed from «light greenish turquoise»)<br>2 g of bornite + 25 ml hydrochloric acid / soaking: 6 d. / separation of the liquid and the solid / natural drying / colour of the solid[54]<br>(followed at «very light yellowish green») |
| light yellowish | 2739 | mineral : cement[269]<br>powder : medium brownish grey<br>origin : CALCO, Charlesbourg, Québec<br><br>mineral : chrome<br>powder : light grey, with metallic brilliance<br><br><u>production process</u>:<br>(followed from «green more pronounced than "light green"»)<br>1.50 g of cement + .10 g of chrome / 1625 °F / 1 h |

| | | |
|---|---|---|
| green | | (followed at «medium and intense grass-green») |
| light yellowish green | 2740 | mineral : haematite<br>rock : medium chocolate-brown<br>powder : medium chocolate-brown<br>origin : Nouveau-Québec, Québec<br><br><u>production process:</u><br>0↑1800 °F (dark brown [violet tone]): 4 g + 100 ml sulphuric acid / soaking: 2 wk. / drying on hot plate (iron-grey) / irradiated with electrons at 162,431 rad |
| light yellowish green | 2741 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br><u>production process:</u><br>0↑1900 °F (dark iron-grey): .50 g + 50 ml sulphuric acid / soaking: 2 wk. / drying on hot plate (light yellowish cream [light grey tone]) / irradiated with electrons at 162,431 rad |
| light green (light yellow tone) | 2742 | mineral : steatite<br>rock : light evergreen<br>powder : white<br>origin : East Broughton, Québec<br><br><u>production process:</u><br>0↑1000 °F<br>(followed at «light grey [light brown tone]») |
| light yellowish green | 2743 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>(followed from «light yellow [beige tone] or light yellowish beige»)<br>2 g of fluorine + 20 ml hydrochloric acid / soaking: 3 d. / drying on hot plate (yellow): .2 g + 50 cc of transparent polyester resin + 1% of catalyst / manual grinding / moulding / hardening (very light greenish grey) / irradiated with electrons at 305,082 rad[354] |

464

| | | |
|---|---|---|
| | | mineral : serpentine<br>rock : yellowish green<br>powder : light greenish yellow<br>origin : probably Thetford Mines, Eastern Townships, Québec<br><br>production process:<br>1.50 g of serpentine + 50 cc of transparent polyester resin + 1% of catalyst / manual grinding / moulding / hardening (light green [olive-green type]) / irradiated with gamma rays at: |
| yellowish green more pronounced than «light yellowish green» | 2744 | 5.7 Mrad |
| ↓ | | |
| yellowish green a bit darker | 2745 | 11.4 Mrad |
| ↓ | | |
| yellowish green still darker | 2746 | 17.1 Mrad<br>(followed at «orange [light green tone]») |
| | | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br>production process: |
| yellowish green more pronounced than «light yellowish green» | 2747 | 0↑1900 °F (dark iron-grey): 1 g + 50 ml sulphuric acid / soaking: 2 wk. / drying on hot plate (beige [with grey particles]) / irradiated with electrons at 162,431 rad<br>(followed at «vivid yolk-yellow») |
| | | mineral : serpentine<br>rock : yellowish green<br>powder : light greenish yellow<br>origin : probably Thetford Mines, Eastern Townships, Québec<br><br>production process:<br>.3 g of serpentine + 50 cc of transparent polyester resin + 1% of catalyst / manual grinding / moulding / hardening (light green [light yellow tone]) / irradiated with gamma rays at: |
| yellowish green more prononced than «light yellowish green» | 2748 | 5.7 Mrad |
| ↓ | | |
| yellowish green a | 2749 | 11.4 Mrad |

| | | |
|---|---|---|
| bit darker<br>↓<br>yellowish green still a bit darker | 2750 | 17.1 Mrad |
| yellowish green more intense than «light yellowish green»<br>↓<br>yellowish green still more intense<br>↓<br>medium and mat yellowish green | 2751<br><br><br>2752<br><br>2753 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sulphur (light yellowish green) / irradiated with gamma[228] rays at:<br>63.984 Mrad[439]<br><br>254.204 Mrad<br><br>614.204 Mrad[228] |
| yellowish green much more intense than «light yellowish green» | 2754 | mineral : actinolite<br>rock : light and cold evergreen<br>powder : light grey (light green tone)<br>origin : erratic bloc found at Saint-Philémon, near Dorchester, Québec<br><br>production process:<br>3 g of actinolite + 50 ml sulphuric acid / soaking: 2 wk. / drying on hot plate (light mint-green) / irradiated with gamma rays at 70.4 Mrad[440]<br>(followed at «medium greyish milky chocolate-brown [very, very light orange tone]») |
| | | mineral : apatite<br>rock : light grass-green (light blue and yellow tones), very slightly translucid<br>powder : very light grey (light green tone)<br>origin : region of Buckingham, Québec |

| | | |
|---|---|---|
| yellowish green | 2755 | production process:<br>3 g of apatite + 20 ml hydrochloric acid / soaking: 3 d. / drying on hot plate (white [light yellow reflection]): .3 g + 50 cc of transparent polyester resin + 1% of catalyst / manual grinding / moulding / hardening (fairly vivid light mint-green) / irradiated with gamma rays at 11.4 Mrad |
| yellowish green | 2756 | mineral : calcite (with clayey inclusions)<br>rock : very light creamy yellow, translucid<br>powder : white<br>origin : De-Mix quarry, near Saint-Philippe de Laprairie, Québec<br><br>mineral : chrome<br>powder : light grey, with metallic brilliance<br><br>production process:<br>1.50 g of calcite + .50 g of chrome / 0↑1400 °F + 48 h at 1400 °F[441] |
| yellowish green | 2757 | mineral : chalcocite<br>rock : dark iron-grey (with localized turquoise oxidation)<br>powder : dark iron-grey<br>origin : Butte, Montana, United States<br><br>production process:<br>4 g of chalcocite + 100 ml hydrochloric acid / soaking: 4 yr. / separation of the liquid and the solid / drying on sand bath / colour of the liquid[442]<br>(followed at «greenish yellow» and «medium brown [orange tone]») |
| yellowish green | 2758 | production process:<br>(followed from «intense green [between "grass-green" and "Paris green"]»)<br>4 g of chalcocite + 100 ml hydrochloric acid / soaking: 2 wk. / drying on hot plate / colour of the solid |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance |

467

| | | |
|---|---|---|
| | | production process:<br>(followed from «grass-green [very light blue tone]») |
| yellowish green of various tones which evolves towards | 2759 | .10 g of calcite + 1.50 g of chrome / 1700 °F / 1 h |
| ↓ | 2760 | .10 g of calcite + 1 g of chrome / 1700 °F / 1 h |
| ↓ | 2761 | .10 g of calcite + .50 g of chrome / 1700 °F / 1 h |
| ↓ | 2762 | .10 g of calcite + .25 g of chrome / 1700 °F / 1 h |
| yellowish green which nears «bluish green» | 2763 | .10 g of calcite + .10 g of chrome / 1700 °F / 1 h[338,443] |
| yellowish green which evolves towards | 2764 | .25 g of calcite + 1.50 g of chrome / 1700 °F / 1 h |
| ↓ | 2765 | .25 g of calcite + 1 g of chrome / 1700 °F / 1 h |
| yellowish green [between «bluish green» and «yellowish green»] | 2766 | .25 g of calcite + .50 g of chrome / 1700 °F / 1 h |
| yellowish green which becomes nearer to «bluish green» | 2767 | .25 g of calcite + .25 g of chrome / 1700 °F / 1 h[338,443] |
| yellowish green which becomes still nearer to «bluish green» | 2768 | .25 g of calcite + .10 g of chrome / 1700 °F / 1 h[338]<br>(followed at «intense grass-green») |
| | | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «intense grass-green») |
| blackish grass green | 2769 | .10 g of cement + 1.50 g of chrome / 1700 °F / 1 h |
| which becomes | 2770 | .10 g of cement + 1 g of chrome / 1700 °F / 1 h |

| | | |
|---|---|---|
| more pale and evolves towards ↓ | 2771 | .10 g of cement + .50 g of chrome / 1700 °F / 1 h |
| | 2772 | .10 g of cement + .25 g of chrome / 1700 °F / 1 h |
| yellowish green | 2773 | .10 g of cement + .10 g of chrome / 1700 °F / 1 h (followed at «green of various tones which evolves towards "yellowish green"») |
| | | <u>production process:</u> (followed from «blackish grass-green which evolves towards "yellowish green"») |
| green of various tones which becomes | 2774 | .25 g of cement + 1.50 g of chrome / 1700 °F / 1 h |
| | 2775 | .25 g of cement + 1 g of chrome / 1700 °F / 1 h |
| | 2776 | .25 g of cement + .50 g of chrome / 1700 °F / 1 h |
| nearer to ↓ | 2777 | .25 g of cement + .25 g of chrome / 1700 °F / 1 h |
| yellowish green | 2778 | .25 g of cement + .10 g of chrome / 1700 °F / 1 h (followed at «grass-green of various tones») |
| | | <u>production process:</u> (followed from «grass-green of various tones») |
| yellowish green ↓ | 2779 | 1 g of cement + 1.50 g of chrome / 1700 °F / 1 h |
| green (accentuated yellow tone) | 2780 | 1 g of cement + 1 g of chrome / 1700 °F / 1 h (followed at «grass-green») |
| yellowish green [nears olive-green] | 2781 | mineral : labrador<br>rock : blackish grey<br>powder : medium grey<br>origin : Lac Saint-Jean, Québec<br><br><u>production process:</u><br>2 g of labrador + 20 ml hydrochloric acid / soaking: 3 d. / drying on hot plate |
| | | mineral : wilsonite, local variety of scapolite or wernerite<br>rock : grey (violet tone)<br>powder : light grey (lilac tone) |

| | | |
|---|---|---|
| yellowish green or greenish yellow | 2782 | origin : Tetreault Mine, Montauban, Portneuf county, Québec<br><br>production process:<br>3 g of wilsonite + 50 ml hydrochloric acid / soaking: 2 wk. / drying on hot plate |
| yellowish green | 2783 | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml hydrochloric acid / soaking: 3 d. / drying on hot plate (white [light yellow reflection]): .3 g + 50 cc of transparent polyester resin + 1% of catalyst / manual grinding / moulding / hardening (fairly vivid light mint-green) / irradiated with gamma rays at 11.4 Mrad |
| yellowish green<br>↓ | 2784 | mineral : epidote<br>rock : green (light brown tone [olive-green type])<br>powder : grey (greenish brown tone)<br>origin : Deloro Road, Madoc, Ontario<br><br>production process:<br>12 g of epidote + 40 ml hydrochloric acid / natural drying / colour of the liquid |
| yellowish green | 2785 | 12 g of epidote + 40 ml hydrochloric acid / natural drying / colour of the solid |
| yellowish green<br>↓ | 2786 | mineral : green grossular garnet<br>rock : light and luminous phtalo[217a]-green<br>origin : Jeffrey Mine, Asbestos (presently J.-M. Asbestos), Québec<br><br>production process:<br>opaque green mineralized mass wrapping the garnet is irradiated with gamma rays at:<br>64.7 Mrad |
| yellowish green | 2787 | 102.4 Mrad<br>(followed at «green [light brown tone]») |
| | | mineral : biotite gneiss<br>rock : blackish grey, with golden vitreous brilliance |

| | | |
|---|---|---|
| yellowish green | 2788 | powder : dark grey<br>origin : Grenville geological province, Québec<br><br>production process:<br>12 g of gneiss + 40 ml hydrochloric acid / soaking: 22 d. / separation of the liquid and the solid / natural drying / colour of the solid[444] |
| yellowish green | 2789 | mineral : sardonyx<br>rock : white, slightly translucid (with a light orange-amber circular area on the surface)<br>powder : very light grey<br>origin : unknown<br><br>production process:<br>4 g of sardonyx + 40 ml nitric acid / soaking: 1 wk. / separation of the liquid and the solid / natural drying (colour of the liquid: medium emerald-green[24]) / irradiated with electrons at 305,200 rad[73] |
| yellowish green | 2790 | mineral : spodumene<br>rock : pale green<br>powder : light grey, almost white<br>origin : Québec Lithium Co., Baraute, Abitibi, Québec<br><br>production process:<br>2 g of spodumene + 80 ml nitric acid / soaking: 2 wk. / separation of the liquid and the solid / drying on hot plate / colour of the liquid[160] |
| yellowish green | 2791 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «apple-green lighter than "vivid apple-green"»)<br>0↑800 °F (grey lighter than «light grey»): 5 g + 25 ml hydrochloric acid / soaking: 3 d. / drying on hot plate<br><br>(followed at «yellow [light green tone]») |

| | | |
|---|---|---|
| green (light yellow tone) | 2792 | production process:<br>5 g of iron sulphide - nickel + 25 ml hydrochloric acid / immediate drying on hot plate[446]<br>(followed at «apple-green more vivid than "vivid apple-green"») |
| | | mineral : serpentine<br>rock : yellowish green<br>powder : light greenish yellow<br>origin : probably Thetford Mines, Québec<br><br>production process:<br>rock irradiated with electrons[445] at: |
| yellowish green a bit more intense than «yellowish green»<br>↓ | 2793 | 164,800 rad |
| much more intense yellowish green | 2794 | 305,200 rad[73] |
| | | mineral : idocrase<br>rock : yellowish green, translucid<br>powder : beige (green tone)<br>origin : Jeffrey Mine, Asbestos (presently J.-M. Asbestos), Québec<br><br>production process: |
| yellowish green a bit more accentuated than «yellowish green» | 2795 | rock irradiated with electrons at 164,800 rad<br><br>(followed at «yellowish green [brown tone]») |
| | | mineral : chromite<br>rock : blackish grey<br>powder : medium brownish grey<br>origin : Black Lake, near Thetford Mines, Québec<br><br>production process:<br>(followed from «dark olive-green») |
| intense yellowish green | 2796 | 2 g of chromite + 2 g of sodium carbonate / 0↑1700 °F + 1 h at 1700 °F<br>(followed at «dark apple-green») |
| | | mineral : cement[269]<br>powder : medium brownish grey<br>origin : CALCO, Charlesbourg, Québec<br><br>mineral : chrome<br>powder : light grey, with metallic brilliance |

| | | |
|---|---|---|
| pronounced yellowish green | 2797 | production process:<br>(followed from «dark yellowish green [which evolves towards "cold green, without yellow tone"]»)<br>1 g of cement + 1.50 g of chrome / 1700 °F / 1 h<br>(followed at «pronounced grass-green [yellow tone]») |
| yellowish green more accentuated than «pronounced yellowish green» | 2798 | mineral : serpentine<br>rock : pronounced yellowish green tone (olive-green type)<br>origin : Lac Saint-Jean, Québec<br><br>production process:<br>rock irradiated with electrons at 164,800 rad |
| yellowish green darker than «pronounced yellowish green» | 2799 | production process:<br>rock irradiated with gamma rays at 63.984 Mrad<br><br>(followed at «brownish green») |
| yellowish green or greenish yellow darker than «intense yellowish green» or «intense greenish yellow» | 2800 | mineral : chromite<br>rock : blackish grey<br>powder : medium brownish grey<br>origin : Black Lake, near Thetford Mines, Québec<br><br>production process:<br>2 g of chromite + 2 g of sodium carbonate / 0↑1700 °F + 1 h at 1700 °F (intense yellowish green) / irradiated with gamma rays at 64.7 Mrad<br><br>(followed at «mixture of particles: chocolate-brown / yellow») |
| dark green (light yellow reflection) | 2801 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «light beige»)<br>2 g of fluorine + 20 ml hydrochloric acid / soaking: 3 d. / drying on hot plate (very light greyish beige): .2 g + 50 cc of transparent polyester resin + 1% of catalyst / manual grinding / moulding / hardening (yellow reflection [almost colourless]) / irradiated with electrons at 305,082 rad[354] |

473

| | | |
|---|---|---|
| | | mineral : cement[269]<br>powder : medium brownish grey<br>origin : CALCO, Charlesbourg, Québec<br><br>mineral : chrome<br>powder : light grey, with metallic brilliance<br><br><u>production process:</u><br>(followed from «dark grass-green [diminished yellow tone]») |
| dark yellowish green | 2802 | .25 g of cement + 1.50 g of chrome / 1700 °F / 1 h |
| | 2803 | .25 g of cement + 1 g of chrome / 1700 °F / 1 h |
| the yellow tone diminishes | 2804 | .25 g of cement + .50 g of chrome / 1700 °F / 1 h |
| | 2805 | .25 g of cement + .25 g of chrome / 1700 °F / 1 h |
| | 2806 | .25 g of cement + .10 g of chrome / 1700 °F / 1 h |
| dark green (yellow tone) | 2807 | .50 g of cement + 1.50 g of chrome / 1700 °F / 1 h |
| | 2809 | .50 g of cement + 1 g of chrome / 1700 °F / 1 h |
| which evolves towards | 2810 | .50 g of cement + .50 g of chrome / 1700 °F / 1 h |
| ↓ | 2811 | .50 g of cement + .25 g of chrome / 1700 °F / 1 h |
| cold green (without any yellow tone) | 2812 | .50 g of cement + .10 g of chrome / 1700 °F / 1 h<br><br>(followed at «pronounced yellowish green») |
| | | mineral : crocidolite<br>rock : dark greyish blue<br>powder : pale greyish blue<br>origin : Griqualand district, South Africa<br><br><u>production process:</u> |
| dark green (light yellow tone) | 2813 | 250 g of crocidolite + 1650 ml hydrochloric acid in a 2000 ml becher <u>or</u> crocidolite entirely covered with hydrochloric acid in a vertical container / soaking: 1 wk. / drying on hot plate (formation of 2 superposed layers of colours) / colour of the layer at the bottom[447] |

| | | |
|---|---|---|
| | | (followed at «dark green [mint-green type]») |
| dark yellowish green | 2814 | mineral : biotite gneiss<br>rock : blackish grey, with golden vitreous brilliance<br>powder : dark grey<br>origin : Grenville geological province, Québec<br><br>production process:<br>(followed from «yellowish green»)<br>12 g of gneiss + 40 ml hydrochloric acid / soaking: 22 d. / separation of the liquid and the solid / natural drying / colour of the liquid |
| green (honey-yellow tone) | | |
| green (light honey-yellow tone) | 2815 | mineral : idocrase<br>rock : yellowish green, translucid<br>powder : beige (green tone)<br>origin : Jeffrey Mine, Asbestos (presently J.-M. Asbestos), Québec<br><br>production process:<br>rock irradiated with gamma rays at 5.7 Mrad<br>(followed at «dark and accentuated olive-green») |
| yellowish green (orange tone) | | |
| yellowish green (light orange or caramel tone) a bit more intense than «pale yellowish green (light orange or caramel tone)»<br>↓ | 2816 | mineral : antigorite<br>rock : pale yellowish green<br>powder : very pale greenish yellow<br>origin : Canadian Refractories Mine, Kilmar, Québec<br><br>production process:<br>rock irradiated with electrons at:<br>302,831 rad[45] |
| yellowish green (light orange or caramel tone) a bit more intense than «pale yellowish green | 2817 | 305,200 rad[46] |

| | | |
|---|---|---|
| (light orange or caramel tone)» | | |
| yellowish green (light orange or caramel tone) [between «yellowish green» and «brownish green»] | 2818 | <u>production process:</u><br>rock irradiated with gamma rays at:<br>5 Mrad |
| ↓ | | |
| yellowish green (orange or caramel tone) a bit more accentuated | 2819 | 10 Mrad<br><br>(followed at «caramel-brown [light green tone]») |
| yellowish green (orange reflection) more accentuated than «yellowish green (orange reflection)» | 2820 | mineral : steatite<br>rock : light evergreen<br>powder : white<br>origin : East Broughton, Québec<br><br><u>production process:</u><br>(followed from «apple-green»)<br>2 g of steatite + 2 g of sodium carbonate / 0↑1700 °F + 45 min. at 1700 °F (green) / irradiated with gamma rays at 424.7 Mrad |
| yellowish green (brown tone) | | |
| yellowish green (brown reflection) darker than «light yellowish green (brown reflection)» | 2821 | mineral : hornblende<br>rock : medium evergreen (light grey tone), with vitreous brilliance<br>powder : medium cold grey (light green tone)<br>origin : Abitibi, Québec<br><br><u>production process:</u><br>(followed from «light brown»)<br>3 g of hornblende + 25 ml hydrochloric acid / soaking: 24 h / drying on hot plate (medium orange brown [light green tone, khaki-green type]): .2 g + 50 cc of transparent polyester resin + 1% of catalyst / manual grinding / moulding / hardening (light grey [light green reflection]) / irradiated with electrons at 305,082 rad[354] |
| | | mineral : idocrase<br>rock : yellowish green, translucid<br>powder : beige (green tone)<br>origin : Jeffrey Mine, Asbestos (presently J.-M. Asbestos), Québec |

| | | |
|---|---|---|
| yellowish green (brown tone) a bit more accentuated and dark than «yellowish green (brown tone)» | 2822 | production process:<br>(followed from «yellowish green»)<br>rock irradiated with electrons at 305,200 rad[73] |
| yellowish green (grey tone) | | |
| yellowish green (grey reflection) more intense than «very light yellowish green (grey reflection)» | 2823 | mineral : hornblende<br>rock : medium evergreen (light grey tone), with vitreous brilliance<br>powder : medium cold grey (light green tone)<br>origin : Abitibi, Québec<br><br>production process:<br>(followed from «light greyish beige or light grey [beige tone]»)<br>3 g of hornblende + 25 ml nitric acid / soaking: 24 h / drying on hot plate (medium greyish evergreen [light yellow tone]): .2 g + 50 cc of transparent polyester resin + 1% of catalyst / manual grinding / moulding / hardening (very light cold grey [light green reflection]) / irradiated with electrons at 305,082 rad[354] |

GREENISH YELLOW

| colour obtained | number | mineral / production process |
|---|---|---|
| pale greenish yellow | 2824 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>production process:<br>1 g of tremolite + 1.50 g of sodium carbonate / 1600 °F / 8 h (very dark grass-green): .50 g + .50 g of sulphur |
| yellow (light green reflection) a bit darker than «pale greenish yellow» | 2825 | mineral : orthoclase<br>rock : white (grey reflection)<br>powder : white (grey reflection)<br>origin : mine near Buckingham, Papineau county, Québec<br><br>production process:<br>(followed from «light brown»)<br>2 g of orthoclase + 20 ml nitric acid / soaking: 3 d. / drying on hot plate (white [light yellow reflection]): .3 g + 50 cc of transparent polyester resin + 1% of catalyst / manual grinding / moulding / hardening (pale yellow) / irradiated with electrons at 305,082 rad[354] |
| greenish yellow a bit more accen- | 2826 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>(followed from «light beige»)<br>2 g of fluorine + 20 ml sulphuric acid / soaking: 3 d. / drying on hot plate (light beige [brown |

| | | |
|---|---|---|
| tuated than «very, very light greenish yellow» | | tone]): .2 g + 50 cc of transparent polyester resin + 1% of catalyst / manual grinding / moulding / hardening (very, very light yellow) / irradiated with electrons at 305,082 rad[354] |
| greenish yellow a bit more accentuated than «very, very light greenish yellow» | 2827 | mineral : steatite<br>rock : light evergreen<br>powder : white<br>origin : East Broughton, Québec<br><br><u>production process:</u><br>(followed from «light grey [beige tone]»)<br>2 g of steatite + 20 ml hydrochloric acid / soaking: 3 d. / drying on hot plate (light cream): .3 g + 50 cc of transparent polyester resin + 1% of catalyst / manual grinding / moulding / hardening (very, very light greenish yellow) / irradiated with electrons at 305,082 rad[354] |
| yellow (light green reflection) a bit more accentuated than «very, very light greenish yellow» | 2828 | mineral : amazonite<br>rock : greenish turquoise<br>powder : white (turquoise reflection)<br>origin : Lac Saint-Jean, Québec<br><br><u>production process:</u><br>(followed from «light greyish beige or light grey [beige tone]»)<br>.2 g of amazonite + 50 cc of transparent polyester resin + 1% of catalyst / manual grinding / moulding / hardening (very, very light greenish yellow) / irradiated with electrons at 305,082 rad[354] |
| greenish yellow a bit more accentuated and dark than «very, very light greenish yellow» | 2829 | mineral : halite[41]<br>rock : colourless<br>powder : colourless<br>origin : Seleine Mine, Iles-de-la-Madeleine, Québec<br><br><u>production process:</u><br>(followed from «light brown»)<br>.3 g of halite + 50 cc of transparent polyester resin + 1% of catalyst / manual grinding / moulding / hardening (very, very light yellowish green) / irradiated with electrons at 305,082 rad[354] |
| | | mineral : steatite<br>rock : light cold grey, slightly translucid<br>powder : light grey |

| | | |
|---|---|---|
| very light greenish yellow | 2830 | provenance: East Broughton, Québec<br><br>production process:<br>(followed from «ivory beige»)<br>30 g of steatite + 50 ml nitric acid / soaking: 1 wk. / drying on hot plate (beige [very light orange tone]): .3 g + 50 cc of transparent polyester resin + 1% of catalyst / manual grinding / moulding / hardening (very, very light grey) / irradiated with electrons at 305,082 rad[354] |
| very light greenish yellow | 2831 | mineral : sphalerite[27]<br>rock : dark grey, golden yellow metallic brilliance<br>powder : dark brownish grey<br>origin : Matagami Mine, Matagami, Québec<br><br>production process:<br>(followed from «light yellow»)<br>0↑1800 °F (medium chocolate-brown): 1 g + 50 ml sulphuric acid / soaking: 2 wk. / drying on hot plate (white) / irradiated with electrons at 302,831 rad[45] |
| light yellow (very light green tone) | 2832 | production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) liquid (2nd) at the surface; b) the layer between a] and b]: a mixture of the liquid and the solid; c) the residual solid at the bottom of the solution / natural drying / colour of c): residual solid[448] |
| light yellow (very light green tone) | 2833 | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml nitric acid / soaking: 3 d. / drying on hot plate (white [yellow reflection]): .3 g + 50 cc of transparent polyester resin + 1% of catalyst / manual grinding / moulding / hardening (light grey [yellow reflection]) / irradiated with gamma rays at 5.7 Mrad |
| | | mineral : serpentine<br>rock : yellowish green |

| | | |
|---|---|---|
| light or whitened greenish yellow | 2834 | powder : light greenish yellow<br>origin : probably Thetford Mines, Eastern Townships, Québec<br><br>production process:<br>2 g of serpentine + 2 g of sodium carbonate / grinding |
| light yellow (light green tone) a bit more accentuated than «light greenish yellow» | 2835 | mineral : calcite[11,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>(followed from «light yellow»)<br>1.50 g of calcite + .50 g of chrome / 1400 °F / 1 h<br><br>(followed at «light grass-green [light yellow tone]» and «very light green») |
| light yellow (light green tone) | 2836 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>4 g of pentlandite + 60 ml nitric acid / soaking: 2 wk. / separation of the liquid and the solid / desiccation / colour of the solid[450] |
| light yellow (light green tone) | 2837 | mineral : stibnite<br>rock : dark grey, with metallic brilliance<br>powder : dark grey, with metallic brilliance<br>origin : Hunan, China<br><br>production process:<br>3 g of stibnite + 25 ml nitric acid / soaking: 12 h / separation of the liquid and the solid / natural drying / colour of the solid[451] |
| | | mineral : nickeliferous pyrrhotite[23]<br>rock : dark iron-grey, with silver and golden yellow metallic brilliance<br>powder : dark iron-grey<br>origin : Inco Co., Sudbury, Ontario |

| | | |
|---|---|---|
| light yellow (light green tone) | 2838 | production process:<br>0↑1900 °F (dark iron-grey): 1 g + 50 ml hydrochloric acid / soaking: 2 wk. / drying on hot plate (very dark brown, almost black) / irradiated with electrons at 162,431 rad<br>(followed at «light apple-green») |
| light greenish yellow | 2839 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «light brown»)<br>.2 g of fluorine + 50 cc of transparent polyester resin + 1% of catalyst / manual grinding / moulding / hardening (very, very light greenish yellow) / irradiated with electrons at 305,082 rad[354] |
| light greenish yellow or light yellowish green | 2840 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (white [pinkish beige reflection]): .2 g + 50 cc of transparent polyester resin + 1% of catalyst / manual grinding / moulding / hardening (very light grey [light greenish yellow reflection]) / irradiated with electrons at:<br>155,082 rad |
| ↓ light greenish yellow | 2841 | 305,082 rad[354] |
| light greenish yellow | 2842 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>4 g of pentlandite + 80 ml sulphuric acid / soaking: 2 wk. / drying on hot plate (light creamy yellow) / irradiated with electrons at 162,431 rad |

| | | |
|---|---|---|
| light greenish yellow | 2843 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 50 ml sulphuric acid / soaking: 2 wk. / drying on hot plate (white [light yellow or beige reflection]) / irradiated with gamma rays at 70.4 Mrad<br>(followed at «medium greyish beige [light orange tone]») |
| light greenish yellow | 2844 | mineral : sulphur<br>rock : brilliant yellow<br>powder : brilliant yellow<br>origin : unknown<br><br>production process:<br>1 g of sulphur + 1 g of sodium carbonate / 0↑1700 °F |
| light greenish yellow | 2845 | mineral : steatite<br>rock : light cold grey, slightly translucid<br>powder : light grey<br>origin : East Broughton, Québec<br><br>production process:<br>2 g of steatite + 2 g of sodium carbonate / 0↑1800 °F + 1 h at 1800 °F (creamy yellow [light green reflection]) / irradiated with gamma rays at 64.7 Mrad<br>(followed at «greyish beige [green reflection]») |
| light greenish yellow or light yellowish green | 2846 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «medium brownish beige [pink tone]»)<br>2 g of molybdenite + 2 g of sodium carbonate:<br>0↑900 °F + 1 h at 900 °F |
| ↓ light yellow (light green tone) | 2847 | 0↑1000 °F + 1 h at 1000 °F<br>(followed at «creamy yellow [light green tone]») |

| | | |
|---|---|---|
| light greenish yellow | 2848 | mineral : clay<br>block : pale greyish green<br>powder : pale greyish green<br>origin : bank of Saint-Lawrence river at the rear of the Miguasha Museum, Gaspésie, Québec<br><br>production process:<br>4 g of clay + 200 ml hydrochloric acid / soaking: 4 yr. / drying on hot pate[452] |
| light and accentuated greenish yellow | 2849 | mineral : fuel oil soot[86]<br>powder : profound brownish black<br>origin : boiler room of Laval University, city of Québec, Québec<br><br>production process:<br>(followed from «light ivory [light green tone]»)<br>2 g of soot + 20 ml sulphuric acid / soaking: 24 h / deposited on a hot plate / brought to boiling point / immediately after boiling, separation of the liquid and the solid / drying on hot plate (colour of the liquid: grass-green [grey tone], cold and mat): .2 g + 50 cc of transparent polyester resin + 1% of catalyst / manual grinding / moulding / hardening (very, very light yellowish green) / irradiated with electrons at 305,082 rad[354] |
| greenish yellow more accentuated than «light greenish yellow» | 2850 | mineral : apatite<br>rock : medium brownish red<br>powder : light pinkish beige<br>origin : Ile Calumet, Pontiac county, Québec<br><br>production process:<br>(followed from «light brown»)<br>3 g of apatite + 25 ml sulphuric acid / soaking: 3 d. / drying on hot plate (beige [grey tone]): .3 g + 50 cc of transparent polyester resin + 1% of catalyst / manual grinding / moulding / hardening (light lemon-yellow) / irradiated with electrons at 305,082 rad[354] |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «ivory») |

| | | |
|---|---|---|
| greenish yellow more accentuated than «light greenish yellow» | 2851 | 2 g of fluorine + 20 ml nitric acid / soaking: 3 d. / drying on hot plate (pink): .2 g + 50 cc of transparent polyester resin + 1% of catalyst / manual grinding / moulding / hardening (light grey [light yellowish green reflection]) / irradiated with electrons at 305,082 rad[354] |
| greenish yellow more accentuated and luminous than «light greenish yellow» | 2852 | mineral : serpentine<br>rock : yellowish green<br>powder : light greenish yellow<br>origin : probably Thetford Mines, Eastern Townships, Québec<br><br>production process:<br>powder irradiated with electrons at 162,431 rad<br><br>(followed at «medium beige [green tone]») |
| yellow (light green tone), much more accentuated and vivid than «light greenish yellow» | 2853 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>4 g of pentlandite + 80 ml nitric acid / soaking: 2 wk. / separation of the liquid and the solid / desiccation (colour of the solid: light yellow [light green tone]) / irradiated with gamma rays at 70.4 Mrad<br>(followed at «dark milky chocolate-brown [grey tone and orange reflection]») |
| greenish yellow a bit more accentuated and dark than «light greenish yellow» | 2854 | mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>(followed from «very light brown»)<br>2 g of fluorine + 20 ml sulphuric acid / soaking: 3 d. / drying on hot plate (very light beige): .2 g + 50 cc of transparent polyester resin + 1% of catalyst / manual grinding / moulding / hardening (light lemon-yellow) / irradiated with electrons at 305,082 rad[354] |
| | | mineral : sulphur<br>rock : brilliant yellow<br>powder : brilliant yellow |

| | | |
|---|---|---|
| greenish yellow a bit darker than «light greenish yellow» | 2855 | origin : unknown<br><br>production process:<br>(followed from «apple-green [yellow tone]»)<br>1 g of sulphur + 1 g of sodium carbonate / 0↑1700 °F (light greenish yellow) / irradiated with gamma rays at 423.89 Mrad |
| greenish yellow | 2856 | mineral : apatite<br>rock : pale brownish green<br>powder : very light greyish green<br>origin : Black Lake, Thetford county, Québec<br><br>production process:<br>mass of feldspar wrapping the apatite, irradiated with gamma rays at 244.53 Mrad[67,433]<br>(followed at «brownish beige») |
| yellow (light green tone) | 2857 | mineral : dolomite<br>rock : light grey<br>powder : light grey<br>origin : Shefferville, Ungava, Québec<br><br>production process:<br>2 g of dolomite + 2 g of sodium carbonate / 0↑1900 °F + 1 h at 1900 °F (olive-green lighter than «olive-green») / irradiated with electrons at 162,431 rad<br>(followed at «light honey-yellow») |
| yellow (light green tone) | 2858 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «light blue»)<br>powder finely grinded and heated 0↑1200 °F (Naples yellow): .50 g + 15 ml nitric acid / soaking: 2 d. / drying on hot plate<br>(followed at «yellow [Naples yellow type]») |
| | | mineral : iron sulphide - nickel[353]<br>rock : medium greyish green<br>powder : light grey (light green tone)<br>origin : small copper and nickel deposit, in |

| | | |
|---|---|---|
| | | the South-Western area of a mass of serpentinite at 3 km at the West of Saint-Fabien-de-Panet, Québec<br><br>production process:<br>(followed from «yellowish green») |
| yellow (light green tone) | 2859 | 0†900 °F (grey [light beige tone]): 5 g + 25 ml hydrochloric acid / soaking: 3 d. / drying on hot plate<br>(followed at «yellow more accentuated than "yellow"») |
| greenish yellow | 2860 | mineral : tiger-eye agate<br>rock : orange with silky brilliance, opaque<br>powder : orange with silky brilliance<br>origin : Africa<br><br>production process:<br>3 g of agate + 40 ml nitric acid / soaking: 1 wk. / separation of the liquid and the solid / natural drying / colour of the liquid[453] |
| greenish yellow | 2861 | mineral : beryl<br>rock : intense grass-green, slightly translucid<br>powder : greenish grey<br>origin : unknown<br><br>production process:<br>3 g of beryl + 40 ml hydrochloric acid / soaking: 1 wk. / separation of the liquid and the solid / natural drying (colour of the solid: pale apple-green) / irradiated with electrons at 305,200 rad[73] |
| greenish yellow | 2862 | mineral : chalcocite<br>rock : dark iron-grey (with localized turquoise oxidation)<br>powder : dark iron-grey<br>origin : Butte, Montana, United States<br><br>production process:<br>(followed from «yellowish green»)<br>4 g of chalcocite + 100 ml hydrochloric acid / soaking: 4 yr. / separation of the liquid and the solid / drying on sand bath / colour of the solid[75]<br>(followed at «medium brown [orange tone]») |
| | | mineral : uraninite<br>rock : medium chocolate-brown (red Bordeau tone)<br>powder : medium milky chocolate-brown |

| | | |
|---|---|---|
| greenish yellow | 2863 | origin : Yellowknife, Canada<br><br>production process:<br>0↑1900 °F (medium brown [orange tone]): 1 g + 50 ml sulphuric acid / soaking: 2 wk. / drying on hot plate |
| greenish yellow | 2864 | mineral : steatite<br>rock : light cold grey, slightly translucid<br>powder : light grey<br>origin : East Broughton, Québec<br><br>production process:<br>(followed from «ivory»)<br>0↑1200 °F (grey more accentuated than «light grey»): 2 g + 5 ml hydrochloric acid + 20 ml nitric acid / soaking: 3 d. / drying on hot plate (very, very light brown): .3 g + 50 cc of transparent polyester resin + 1% of catalyst / manual grinding / moulding / hardening (very, very light yellow) / irradiated with electrons at 305,082 rad[354] |
| | 2865 | mineral : beryl<br>rock : white with yellowish green reflection and translucid<br>powder : white (green reflection)<br>origin : Lacorne district, Abitibi, Québec<br><br>production process:<br>rock irradiated with gamma rays[67] at: |
| greenish yellow | 2866 | 5 Mrad |
| ↓ | 2867 | 10 Mrad |
| which | 2868 | 57.4 Mrad |
| ↓ | 2869 | 64.7 Mrad |
| intensifies | 2870 | 102.4 Mrad |
| itself and | 2871 | 201.6 Mrad |
| becomes | 2872 | 247.6 Mrad |
| ↓ | 2873 | 287.3 Mrad |
| light lemon- | 2874 | 360 Mrad |
| yellow | 2875 | 424.7 Mrad |
| | | mineral : uraninite<br>rock : medium chocolate-brown (red Bordeau tone)<br>powder : medium milky chocolate-brown<br>origin : Yellowknife, Canada<br><br>production process:<br>0↑1900 °F (medium brown [orange tone]): 1 g + 50 ml sulphuric acid / soaking: 2 wk. / drying on hot plate (greenish yellow) / irradiated with |

| | | |
|---|---|---|
| greenish yellow more intense than «greenish yellow» | 2876 | electrons at: 162,431 rad |
| ↓ | | |
| greenish yellow more intense than «greenish yellow» | 2877 | 302,831 rad[45] |
| greenish yellow more intense than «greenish yellow» | 2878 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>3 g of wilsonite + 50 ml hydrochloric acid / soaking: 2 wk. / drying on hot plate (yellowish green or greenish yellow) / irradiated with gamma[239] rays at 64.7 Mrad<br>(followed at «yolk-yellow [orange reflection]») |
| greenish yellow more strong and intense than «light greenish yellow» | 2879 | mineral : beryl<br>rock : very light greenish blue, slightly translucid<br>origin : Brassard district, Berthier county, Québec<br><br>production process:<br>(followed from «olive-green more accentuated than "light olive-green"»)<br>rock irradiated with gamma rays at 602.804 Mrad |
| greenish yellow much more intense than «greenish yellow» | 2880 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «light beige»)<br>2 g of fluorine + 20 ml sulphuric acid / soaking: 3 d. / drying on hot plate (light brown): .2 g + 50 cc of transparent polyester resin + 1% of catalyst / manual grinding / moulding / hardening (greenish yellow) / irradiated with electrons at 305,082 rad[354] |

| | | |
|---|---|---|
| | | mineral : steatite<br>rock : light cold grey, slightly translucid<br>powder : light grey<br>origin : East Broughton, Québec<br><br>production process:<br>2 g of steatite + 15 ml hydrochloric acid + 10 ml water / soaking: 3 d. / drying on hot plate (orange more pronounced than «fairly pronounced orange»): .3 g + 50 cc of transparent polyester resin + 1% of catalyst / manual grinding / moulding / hardening (very, very light orange) / irradiated with gamma rays at: |
| greenish yellow | 2881 | 5.7 Mrad |
| ↓ | | |
| darker greenish yellow | 2882 | 11.4 Mrad |
| ↓ | | |
| greenish yellow still more intense | 2883 | 17.1 Mrad<br>(followed at «orange more vivid and darker than "orange"») |
| | | mineral : armenite<br>rock : light grey<br>powder : very light grey<br>origin : Abitibi, Québec<br><br>production process:<br>(followed from «light cream [green tone]») |
| intense yellow (very light green tone) | 2884 | 1 g of armenite + 50 ml nitric acid / soaking: 2 wk. / drying on hot plate (light cream [green tone]) / irradiated with gamma rays at 424.7 Mrad |
| | | mineral : asbestos[4]<br>rock : dark grey (green reflection)<br>powder : light grey (green reflection)<br>origin : Asbestos Corporation Ltd., Thetford Mines, Québec<br><br>production process: |
| intense yellow (light green tone) | 2885 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]) / irradiated with gamma rays at 190.22 Mrad (followed at «brownish yellow») |
| | | mineral : beryl<br>rock : very light yellowish green, slightly translucid |

| | | |
|---|---|---|
| very pronounced greenish yellow [yellow mustard type] | 2886 | powder : white (green reflection)<br>origin : Lacorne district, Abitibi, Québec<br><br>production process:<br>(followed from «green strongly more accentuated than "very light green"»)<br>rock irradiated with gamma rays at 604.53 Mrad[67] |
| greenish yellow darker than «vivid greenish yellow» | 2887 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «daisy-yellow»)<br>50 g of asbestos + 200 ml hydrochloric acid or asbestos entirely covered with hydrochloric acid / soaking: 1 wk. / drying on hot plate (vivid yellow) / irradiated with gamma rays at 614.20 Mrad |
| greenish yellow more intense and darker than «vivid greenish yellow» | 2888 | mineral : chalcopyrite<br>rock : brass-yellow, with metallic luster<br>powder : dark grey (with golden particles)<br>origin : Noranda Mines, Noranda, Abitibi, Québec<br><br>production process:<br>(followed from «light and vivid yellow [light orange tone]»)<br>2 g of chalcopyrite + 2 g of sodium carbonate / 0↑1800 °F + 1 h at 1800 °F (vivid lemon-yellow) / irradiated with gamma rays at 424.7 Mrad |
| dark yellow (light green reflection) | 2889 | mineral : apatite<br>rock : reddish brown<br>powder : light pinkish beige<br>origin : Calumet, Pontiac county, Québec<br><br>production process:<br>(followed from «light beige»)<br>3 g of apatite + 25 ml nitric acid / soaking: 3 d. / drying on hot plate (light beige): .2 g + 50 cc of transparent polyester resin + 1% of catalyst / manual grinding / moulding / hardening (very, very light yellowish grey) / irradiated with electrons at 305,082 rad[354] |

| | | |
|---|---|---|
| dark yellow (light green tone) | 2890 | mineral : serpentine<br>rock : yellowish green<br>powder : light greenish yellow<br>origin : probably Thetford Mines, Eastern Townships, Québec<br><br>production process:<br>(followed from «light beige»)<br>.2 g of serpentine + 50 cc of transparent polyester resin + 1% of catalyst / manual grinding / moulding / hardening (pale yellowish grey) / irradiated with electrons at 305,082 rad[354] |
| dark greenish yellow | 2891 | mineral : halite[41]<br>rock : colourless<br>powder : colourless<br>origin : Seleine Mine, Iles-de-la-Madeleine, Québec<br><br>production process:<br>(followed from «light yellow [ivory tone]»)<br>2 g of halite + 20 ml sulphuric acid / soaking: 3 d. / drying on hot plate (light beige [light grey tone]): .3 g + 50 cc of transparent polyester resin + 1% of catalyst / manual grinding / moulding / hardening (very light grey [light yellow reflection]) / irradiated with electrons at 305,082 rad[354] |
| dark greenish yellow | 2892 | mineral : orthoclase<br>rock : light pinkish beige<br>powder : very light beige<br>origin : mine near Buckingham, Papineau county, Québec<br><br>production process:<br>(followed from «light greyish beige or light beige [grey tone]»)<br>2 g of orthoclase + 20 ml hydrochloric acid / soaking: 3 d. / drying on hot plate (very, very light pink): .3 g + 50 cc of transparent polyester resin + 1% of catalyst / manual grinding / moulding / hardening (greenish grey) / irradiated with electrons at 305,082 rad[354] |
| | | mineral : amazonite<br>rock : greenish turquoise<br>powder : white (turquoise reflection)<br>origin : Lac Saint-Jean, Québec<br><br>production process:<br>(followed from «light beige») |

| | | |
|---|---|---|
| dark greenish yellow | 2893 | 2 g of amazonite + 20 ml sulphuric acid / soaking: 3 d. / drying on hot plate (cream [very light green tone]): .2 g + 50 cc of transparent polyester resin + 1% of catalyst / manual grinding / moulding / hardening (light grey [light yellow reflection]) / irradiated with electrons at 305,082 rad[354] |
| dark greenish yellow | 2894 | mineral : beryl<br>rock : very light yellowish green, slightly translucid<br>powder : white (green reflection)<br>origin : Lacorne district, Abitibi, Québec<br><br>production process:<br>(followed from «light ivory»)<br>.3 g of beryl + 50 cc of transparent polyester resin + 1% of catalyst / manual grinding / moulding / hardening (white [light yellow reflection]) / irradiated with electrons at 305,082 rad[354] |
| dark greenish yellow | 2895 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>(followed from «light ivory»)<br>2 g of fluorine + 20 ml nitric acid / soaking: 3 d. / drying on hot plate (very, very light orange): .2 g + 50 cc of transparent polyester resin + 1% of catalyst / manual grinding / moulding / hardening (very, very light grey [light yellow reflection]) / irradiated with electrons at 305,082 rad[354] |
| dark and intense greenish yellow | 2896 | mineral : calcite<br>rock : light pink<br>powder : pinkish white<br>origin : Huddersfield district, Pontiac county, Québec<br><br>production process:<br>(followed from «light beige»)<br>4 g of calcite + 20 ml sulphuric acid / soaking: 3 d. / drying on hot plate (light beige [localized light pink tone]): .3 g + 50 cc of transparent polyester resin + 1% of catalyst / manual grinding / moulding / hardening (light lemon-yellow) / irradiated with electrons at 305,082 rad[354] |

| | | |
|---|---|---|
| mixture of particles | | |
| greenish yellow more intense than «greenish yellow» / brown (orange tone) more intense than «brown (orange tone)» | 2897 | mineral : uraninite<br>rock : medium chocolate-brown (red Bordeau tone)<br>powder : medium milky chocolate-brown<br>origin : Yellowknife, Canada<br><br>production process:<br>0↑1900 °F (medium brown [orange tone]): 1 g + 50 ml sulphuric acid / soaking: 2 wk. / drying on hot plate (greenish yellow) / irradiated with gamma rays at 63.88 Mrad<br><br>(followed at «dark greyish beige») |
| vivid yellow (very light green tone) / medium brown (orange tone) | 2898 | mineral : chromite<br>rock : blackish grey<br>powder : medium brownish grey<br>origin : Black Lake, near Thetford Mines, Québec<br><br>production process:<br>(followed from «yellow ochre [light green tone]»)<br>2 g of chromite + 2 g of sodium carbonate / 0↑1700 °F + 1 h at 1700 °F (intense yellowish green) / irradiated with electrons at 302,831 rad[45] |
| greenish yellow (orange tone) | | |
| light greenish yellow (light orange tone) | 2899 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>4 g of pentlandite + 80 ml nitric acid / soaking: 2 wk. / separation of the liquid and the solid / desiccation (colour of the solid: light yellow [light green tone]) / irradiated with electrons at 162,431 rad |
| light greenish | 2900 | mineral : haematite<br>rock : medium chocolate-brown<br>powder : medium chocolate-brown<br>origin : Nouveau-Québec, Québec<br><br>production process:<br>4 g of haematite + 100 ml sulphuric acid / |

| | | |
|---|---|---|
| yellow (localized orange tone) | | soaking: 2 wk. / drying on hot plate (very, very light cream [almost white], light orange tone) / irradiated with electrons at 162,431 rad (followed at «fairly vivid yellow [orange tone]») |
| greenish yellow (brown tone) | | |
| greenish yellow (light brown tone) [diminished green tone] | 2901 | mineral : serpentine<br>rock : yellowish green<br>powder : light greenish yellow<br>origin : probably Thetford Mines, Eastern Townships, Québec<br><br>production process:<br>powder irradiated with gamma rays at 64.7 Mrad<br><br>(followed at «green [brown tone]») |
| greenish yellow (brown tone) a bit more intense and darker than «medium greenish yellow (brown tone)» | 2902 | production process:<br>(followed from «greenish brown»)<br>.3 g of serpentine + 50 cc of transparent polyester resin + 1% of catalyst / manual grinding / moulding / hardening (medium greenish yellow [caramel tone]) / irradiated with electrons at 305,082 rad[354] |
| greenish yellow (brown tone) darker than «medium greenish yellow (brown tone)» | 2903 | production process:<br>.3 g of serpentine + 50 cc of transparent polyester resin + 1% of catalyst / manual grinding / moulding / hardening (medium greenish yellow [caramel tone]) / irradiated with gamma rays at 11.4 Mrad |
| greenish yellow (grey tone) | | |
| light greenish yellow (grey tone) | 2904 | mineral : vesuvianite<br>rock : lilac<br>powder : lilac<br>origin : John Mansville Mine, Asbestos, Québec<br><br>production process:<br>(followed from «pale orange-yellow [grey tone]»)<br>0↑1100 °F (grey [lilac tone]): .50 g + 40 ml hydrochloric acid / natural drying<br>(followed at «pale orange-yellow [greyish green tone]») |

YELLOW

| colour obtained | number | mineral / production process |
|---|---|---|
| yellow (ivory tone) | | |
| yellow (ivory tone) darker than «pale yellow (ivory tone)» | 2905 | mineral : apatite<br>rock : reddish brown<br>powder : light pinkish beige<br>origin : Calumet, Pontiac county, Québec<br><br>production process:<br>3 g of apatite + 20 ml sulphuric acid / soaking: 3 d. / drying on hot plate (light brown): .2 g + 50 cc of transparent polyester resin + 1% of catalyst / manual grinding / moulding / hardening (pale lemon-yellow) / irradiated with electrons at 155,082 rad<br>(followed at «lemon-yellow») |
| light yellow (ivory tone) | 2906 | mineral : halite[41]<br>rock : colourless<br>powder : colourless<br>origin : Seleine Mine, Iles-de-la-Madeleine, Québec<br><br>production process:<br>2 g of halite + 20 ml sulphuric acid / soaking: 3 d. / drying on hot plate (light beige [light grey tone]): .3 g + 50 cc of transparent polyester resin + 1% of catalyst / manual grinding / moulding / hardening (very light grey [light yellow reflection]) / irradiated with electrons at 155,082 rad<br>(followed at «dark greenish yellow») |
| creamy yellow | | |
| | | mineral : analcime<br>rock : white (grey reflection), crystalline and translucid<br>powder : light grey<br>origin : De-Mix quarry, North side of Mont Saint-Hilaire, Rouville county, Québec |

| | | |
|---|---|---|
| very light creamy yellow | 2907 | <u>production process:</u><br>(followed from «yellow more pale than "light yellow"»)<br>1 g of analcime + 50 ml hydrochloric acid / soaking: 2 wk. / drying on hot plate (light and vivid lemon-yellow) / irradiated with electrons at 302,831 rad[45] |
| very light creamy yellow | 2908 | mineral : chalcopyrite<br>powder : dark grey (light green tone)<br>origin : Centre de recherche des Mines Noranda in Montréal, Québec<br><br><u>production process:</u><br>4 g of chalcopyrite + 100 ml sulphuric acid / soaking: 2 wk. / drying on hot plate (light grey) / irradiated with electrons at 302,831 rad[36] |
| | 2909 | mineral : serandite<br>rock : beige (light pinkish orange tone), opaque<br>powder : light pink<br>origin : De-Mix quarry, North side of Mont Saint-Hilaire, Rouville county, Québec |
| very light creamy yellow | 2910 | <u>production process:</u><br>12 g of serandite + 40 ml nitric acid / natural drying |
| | | mineral : steatite<br>rock : light cold grey, slightly translucid<br>powder : light grey<br>origin : East Broughton, Québec<br><br><u>production process:</u><br>(followed from «white [yellow reflection]»)<br>2 g of steatite + 2 g of sodium carbonate: |
| very light creamy yellow ↓ | 2911 | 0↑1600 °F + 1 h at 1600 °F |
| more accentuated creamy yellow ↓ | 2912 | 0↑1700 °F + 1 h at 1700 °F<br><br>(followed at «creamy yellow [light green reflection]»)<br>(followed from «creamy yellow [light green reflection]») |
| light creamy yellow | 2913 | 0↑1900 °F + 1 h at 1900 °F |
| | | mineral : calcite (with clayey inclusions)<br>rock : very light creamy yellow, translucid<br>powder : white |

| | | |
|---|---|---|
| | | origin : De-Mix quarry, near Saint-Philippe de Laprairie, Québec<br><br>production process:<br>rock irradiated with gamma rays at: |
| creamy yellow a bit more accentuated than «very light creamy yellow»<br>↓ | 2914 | 5 Mrad |
| creamy yellow a bit more yellow<br>↓ | 2915 | 10 Mrad |
| creamy yellow (yellow tone still a bit more accentuated) | 2916 | 57.4 Mrad<br><br>(followed at «creamy yellow [light beige tone]») |
| | | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 25 ml nitric acid / soaking: 3 d. / drying on hot plate (intense rusty orange): .5 g + 1 cc of transparent printing ink / manual grinding / 14 superimpositions on glazed white paper [following a first copy made with 14 superimpositions] (light creamy yellow) / irradiated with gamma rays at: |
| creamy yellow a bit lighter than «light creamy yellow»<br>↓ | 2917 | 17.91 Mrad[90] |
| creamy yellow a bit lighter than «light creamy yellow» | 2918 | 22.8 Mrad |
| | | mineral : sardonyx<br>rock : white, slightly translucid (with a light orange-amber circular area on the surface)<br>powder : very light grey<br>origin : unknown<br><br>production process: |
| light creamy yellow | 2919 | 4 g of sardonyx + 40 ml hydrochloric acid / soaking: 14 d. / separation of the liquid and the so- |

| | | |
|---|---|---|
| | | lid / natural drying (colour of the solid: pale apple-green) / irradiated with electrons at 305,200 rad[46] |
| light creamy yellow<br>↓<br>light creamy yellow | 2920<br><br>2921 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) / 0↑1900 °F (green) / / irradiated with electrons at:<br>164,800 rad<br><br>305,200 rad[73] |
| light creamy yellow | 2922 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Montréal, Québec<br><br>production process:<br>(followed from «white»)<br>50 g of asbestos + 200 ml hydrochloric acid or asbestos entirely covered with hydrochloric acid / soaking: 1 wk. / drying on hot plate (vivid yellow): .50 g + .50 g of titanium dioxide (light yellow) / irradiated with gamma rays at 614.204 Mrad[454] |
| light creamy yellow | 2923 | mineral : fluorescent calcite<br>rock : white (localized grey or brown reflection), translucid<br>powder : white (yellow reflection)<br>origin : Bancroft, Ontario<br><br>production process:<br>(followed from «very, very pale yellow»)<br>powder irradiated with gamma rays at 124.704 Mrad (followed at «light and mat orange [beige tone]») |

| | | |
|---|---|---|
| light creamy yellow | 2924 | production process:<br>rock irradiated with gamma rays at:<br>5 Mrad |
| ↓ | | |
| light creamy yellow (yellow tone a bit more accentuated) | 2925 | 10 Mrad<br><br>(followed at «light yellow [orange tone]») |
| light creamy yellow | 2926 | mineral : calcite<br>rock : light pink<br>powder : pinkish white<br>origin : Huddersfield district, Pontiac county, Québec<br><br>production process:<br>(followed from «brownish beige»)<br>1 g of calcite + 1 g of sodium carbonate / 1700 °F / 1 h (green) / irradiated with gamma rays at 425.65 Mrad |
| light creamy yellow | 2927 | mineral : microcline<br>rock : white (grey reflection)<br>powder : white (grey reflection)<br>origin : Buckingham, Québec<br>production process:<br>(followed from «light cream»)<br>powder filtered beneath 40 meshes and irradiated with gamma rays at 604.53 Mrad |
| light creamy yellow | 2928 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br>production process:<br>4 g of pentlandite + 80 ml sulphuric acid / soaking: 2 wk. / drying on hot plate |
| | 2929 | mineral : pyrite<br>rock : pale brass-yellow, with metallic brilliance<br>powder : brownish grey (with golden yellow particles)<br>origin : Noranda Mines, Noranda, Abitibi, Québec<br>production process: |
| light creamy yellow | 2930 | 5 g of pyrite + 20 ml nitric acid / soaking: 3 d. / drying on hot plate |
| | 2931 | mineral : serandite<br>rock : white |

| | | |
|---|---|---|
| | | powder : white<br>origin : De-Mix quarry, North side of Mont Saint-Hilaire, Rouville county, Québec<br><br><u>production process:</u> |
| light creamy yellow | 2932 | rock irradiated with gamma rays at 5 Mrad (followed at «very light orange») |
| | | mineral : sulphur<br>rock : brilliant yellow<br>powder : brilliant yellow<br>origin : unknown |
| | 2933 | mineral : zirconium oxide<br>powder : light beige<br>origin : Tam Ceramic Inc., Montréal, Québec<br><br><u>production process:</u> |
| light creamy yellow | 2934 | .50 g of sulphur + .50 g of zirconium oxide / grinding |
| | | mineral : stibnite<br>rock : dark grey, with silver and blue metallic brilliance<br>powder : dark grey<br>origin : Consolidated Durham Mine, Saint-Georges, New Brunswick<br><br><u>production process:</u> |
| light creamy yellow | 2935 | 1 g of stibnite + 100 ml nitric acid / soaking: 2 wk. / separation of the liquid and the solid / drying on hot plate / colour of the solid[455] |
| | | mineral : stilbite<br>rock : white (honey-yellow reflection)<br>powder : white (honey-yellow reflection)<br>origin : Lac d'amiante Mine, Black Lake, Québec<br><br><u>production process:</u> |
| light creamy yellow | 2936 | 3 g of stilbite + 40 ml hydrochloric acid / soaking: 28 d. / drying on hot plate |
| | | mineral : serandite<br>rock : beige (light pinkish orange tone), opaque<br>powder : light pink<br>origin : De-Mix quarry, North side of Mont Saint-Hilaire, Rouville county, Québec |

| | | |
|---|---|---|
| creamy yellow | 2937 | production process:<br>(followed from «vivid yolk—yellow»)<br>12 g of serandite + 40 ml hydrochloric acid / natural drying (very vivid yellow [orange tone]) / irradiated with gamma rays at 423.88 Mrad |
| creamy yellow more accentuated than «creamy yellow» | 2938 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>20 g of quartz - mica + 100 ml hydrochloric acid / soaking: 5 mo. / natural drying |
| creamy yellow lighter than «medium creamy yellow» | 2939 | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «beige a bit more accentuated than "medium beige"»)<br>1600 °F / 1 h (medium beige [pinkish orange tone]) / irradiated with gamma rays at 424.7 Mrad |
| mixture of particles | | |
| | | mineral : coal<br>rock : black<br>powder : brownish black<br>origin : bank of St.-Lawrence river, city of Québec, Québec<br><br>production process:<br>(followed from «brown»)<br>2 g of coal + 2 g of sodium carbonate: |
| creamy yellow / brown / grey | 2940 | 0↑1700 °F + 1 h at 1700 °F |
| ↓ | | |
| creamy yellow / brown / grey | 2941 | 0↑1800 °F + 1 h at 1800 °F |
| ↓ | | |
| creamy yellow / brown / grey | 2942 | 0↑1900 °F + 1 h at 1900 °F |

| | | |
|---|---|---|
| creamy yellow / grass-green (grey tone) | 2943 | mineral : sphalerite[27]<br>rock : dark grey, with golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) liquid (2nd) at the surface; b) the layer between a] and b]: a mixture of liquid and solid; c) residual solid at the bottom of the solution / natural drying (colour of c) the residual solid: light yellow [very light green tone]) / irradiated with gamma rays at 64.7 Mrad<br>(followed at «mixture of particles: iron-grey / brown [orange tone] / milky chocolate-brown») |
| creamy yellow / medium brownish beige | 2944 | mineral : stibnite<br>rock : dark grey, with silver and blue metallic brilliance<br>powder : dark grey<br>origin : Consolidated Durham Mine, Saint-Georges, New Brunswick<br><br>production process:<br>(followed from «beige»)<br>1 g of stibnite + 100 ml hydrochloric acid / soaking: 2 wk. / drying on hot plate (green) / irradiated with electrons at 302,831 rad |
| dark creamy yellow / dark beige | 2945 | mineral : chalcopyrite<br>powder : dark grey (light green tone)<br>origin : Centre de recherche des Mines Noranda in Montréal, Québec<br><br>production process:<br>(followed from «chocolate-brown more pale than "light chocolate-brown"»)<br>4 g of chalcopyrite + 50 ml nitric acid / boiling reaction when the mineral is deposited in the acid / separation of the liquid and the solid immediately after the reaction / the 2 rest separately during 1 wk. / natural drying (colour of the solid: light chocolate-brown) / irradiated with gamma rays at 424.7 Mrad |
| | | mineral : copper concentrate (Cu-FeS)<br>powder : medium chocolate-brown (grey tone)<br>origin : Centre de recherche des Mines Noranda |

| | | |
|---|---|---|
| dark creamy yellow / medium beige (green tone) | 2946 | in Montréal, Québec<br><br>production process:<br>4 g of concentrate + 50 ml nitric acid / soaking: 4 wk. / separation of the liquid and the solid / drying on sand bath (colour of the solid: light green [light blue tone]) / irradiated with gamma rays at 424.7 Mrad[81] |
| creamy yellow (green tone) | | |
| creamy yellow (light green reflection) more accentuated than «creamy yellow (green tone) more acute than "very light creamy yellow (green tone)"» | 2947 | mineral : steatite<br>rock : light and cold grey, slightly translucid<br>powder : light grey<br>origin : East Broughton, Québec<br><br>production process:<br>(followed from «creamy yellow more accentuated "very light creamy yellow"»)<br>2 g of steatite + 2 g of sodium carbonate / 0↑1800 °F + 1 h at 1800 °F<br><br>(followed at «light creamy yellow») |
| creamy yellow (light green tone) | 2948 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «light yellow [light green tone]»)<br>2 g of molybdenite + 2 g of sodium carbonate / 0↑1100 °F + 1 h at 1100 °F<br>(followed at «cream [light orange tone]») |
| | | mineral : antigorite<br>rock : pale yellowish green<br>powder : very pale greenish yellow<br>origin : Canadian Refractories Mine, Kilmar, Québec<br><br>production process:<br>(followed from «beige [light orange tone] lighter than "light beige [orange tone]"») |

| | | |
|---|---|---|
| creamy yellow (light green tone) ↓ | 2949 | 2 g of antigorite + 2 g of sodium carbonate: 0↑1500 °F + 30 min. at 1500 °F |
| creamy yellow (more accentuated green tone) ↓ | 2950 | 0↑1500 °F + 45 min. at 1500 °F |
| creamy yellow (green tone still more accentuated) | 2951 | 0↑1500 °F + 55 min. at 1500 °F<br>(followed at «intense olive-green») |
| creamy greenish yellow (orange tone) | | |
| light creamy yellow (green tone and, in certain areas, green tone with orange reflection) | 2952 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>(followed from «greenish Naples yellow»)<br>0↑1900 °F (dark iron-grey): .50 g + 50 ml sulphuric acid / soaking: 2 wk. / drying on hot plate (very light Naples yellow [light green tone]) / irradiated with gamma rays at 430.4 Mrad |
| creamy yellow (orange tone) | | |
| creamy yellow (light orange tone) lighter than «creamy yellow [orange tone]» | 2953 | mineral : antigorite<br>rock : pale yellowish green<br>powder : very pale greenish yellow<br>origin : Canadian Refractories Mine, Kilmar, Québec<br><br>production process:<br>2 g of antigorite + 2 g of sodium carbonate / 0↑1500 °F + 45 min. at 1500 °F (greenish creamy yellow) / irradiated with electrons at 162,431 rad (followed at «light beige [orange tone]») |
| creamy yellow (beige tone) | | |
| | | mineral : calcite (with clayey inclusions)<br>rock : very light creamy yellow, translucid<br>powder : white<br>origin : De-Mix quarry, near Saint-Philippe de Laprairie, Québec |

| | | |
|---|---|---|
| creamy yellow (light beige tone) | 2954 | <u>production process:</u><br>(followed from «creamy yellow»)<br>rock irradiated with gamma rays at 64.7 Mrad<br>(followed at «yellow [light beige tone]») |
| Naples yellow | | |
| Naples yellow more pale than «very light Naples yellow» | 2955 | mineral : sulphur<br>rock : brilliant yellow<br>powder : brilliant yellow<br>origin : unknown<br><br><u>production process:</u><br>.50 g of sulphur + .50 g of sodium carbonate (very light yellow [Naples yellow type]) / irradiated with gamma rays at 64.7 Mrad<br>(followed at «orange [beige tone], between "light orange [beige tone]" and "medium orange [beige tone]"») |
| very light yellow [Naples yellow type] | 2956 | <u>production process:</u><br>.50 g of sulphur + .50 g of sodium carbonate / grinding |
| Naples yellow a bit darker than «very light Naples yellow» | 2957 | <u>production process:</u><br>.50 g of sulphur + .50 g of sodium carbonate (very light yellow [Naples yellow type]) / irradiated with electrons at 162,431 rad<br>(followed at «Naples yellow [beige tone]») |
| light Naples yellow | 2957.1 | mineral : tellurium<br>powder : dark metallic grey<br>origin : Minéraux Noranda Inc., lot 64, Montréal, Québec<br><br><u>production process:</u><br>3 g of tellurium + 5 g of pyrex / manual grinding / heated: 0↑1700 °F + maintenance during 2 h / the furnace is turned off / slow cooling in the furnace / the entity is done in ambient air |
| light Naples yellow | 2958 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>(followed from «light grey»)<br>powder finely grinded and heated at 1000 °F / 1 h[456] |

| | | |
|---|---|---|
| | | (followed at «greenish Naples yellow» and «Naples yellow») |
| light Naples yellow | 2959 | production process:<br>rock hermetically wrapped in bread dough / 0↑1300 °F / the bread dough is taken off / cooling (dark metallic grey) / then, the rock is heated again 0↑1500 °F in ambient air / removal of the crystals formed at the surface of the rock[456] / colour of the crystals |
| light Naples yellow | 2960 | production process:<br>rock hermetically wrapped in bread dough / 1600 °F / 30 min. / cooling (blackish grey) / the bread dough is taken off and the rock is heated again 0↑1500 °F in ambient air / removal of the crystals formed at the surface of the rock / colour of the crystals |
| areas: light Naples yellow / old rose / milky white | 2960.1 | production process:<br>1 g of molybdenite + 6.50 g of powdered glass (spruce pine batch) / manual grinding / deposited on a ceramic plate at the state of a biscuit / heated in a furnace 0↑1000 °C in ambient air / slow cooling in furnace[1270] |
| | | production process:<br>(followed from «beige»)<br>powder finely grinded and heated: |
| Naples yellow | 2961 | 0↑1000 °F<br><br>(followed at «greenish Naples yellow») |
| ↓ | | (followed from «greenish Naples yellow») |
| Naples yellow | 2962 | 0↑1200 °F<br>(followed at «yellow more accentuated than "light yellow"») |
| | | production process:<br>rock hermetically wrapped in bread dough / 0↑1300 °F / the bread dough is taken off / cooling (dark metallic grey) / the rock is heated again 0↑1500 °F in ambient air / removal of the crystals formed at the surface of the rock (colour of the crystals: light Naples yellow): |
| Naples yellow of various tones | 2963 | .35 g of crystals + 25 ml hydrochloric acid / natural drying |
| ↓ | 2964 | .35 g of crystals + 20 ml hydrochloric acid + 5 ml nitric acid / natural drying |

| | | |
|---|---|---|
| ↓ | 2965 | .35 g of crystals + 15 ml hydrochloric acid + 10 ml nitric acid / natural drying |
| | 2966 | .35 g of crystals + 10 ml hydrochloric acid + 15 ml nitric acid / natural drying |
| | 2967 | .35 g of crystals + 5 ml hydrochloric acid + 20 ml nitric acid / natural drying |
| | 2968 | .35 g of crystals + 25 ml nitric acid / natural drying |
| yellow [Naples yellow type] | 2969 | <u>production process:</u><br>(followed from «yellow [light green tone]»)<br>powder finely grinded and heated 0↑1300 °F (yellow more accentuated than «light yellow»): .50 g + 15 ml nitric acid / soaking: 2 d. / drying on hot plate[456] |
| Naples yellow | 2970 | mineral : dolomite<br>rock : white (localized yellow reflection), crystalline and translucid<br>powder : white<br>origin : Bristol district, Pontiac county, Québec<br><br><u>production process:</u><br>(followed from «light grey»)<br>.3 g of dolomite + 50 cc of transparent polyester resin + 1% of catalyst / manual grinding / moulding / hardening (very, very light grey [light yellow reflection]) / irradiated with electrons at 305,082 rad[354] |
| | | mineral : sericite shale<br>rock : light grey (green reflection)<br>powder : very, very light grey<br>origin : Magog, Québec<br><br><u>production process:</u><br>(followed from «pale orange»)<br>2 g of shale + 2 g of sodium carbonate: |
| Naples yellow ↓ | 2971 | 0↑1700 °F + 1 h at 1700 °F |
| Naples yellow a bit darker ↓ | 2972 | 0↑1800 °F + 1 h at 1800 °F |
| Naples yellow still a bit darker | 2973 | 0↑1900 °F + 1 h at 1900 °F |

| Naples yellow (green tone) | | |
|---|---|---|
| | | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process: |
| very light Naples yellow (light green tone) | 2974 | 0↑1900 °F (dark grey): .50 g + 50 ml sulphuric acid / soaking: 2 wk. / drying on hot plate |
| greenish Naples yellow a bit darker and much more intense than «very light Naples yellow» | 2975 | production process:<br>0↑1900 °F (dark grey): .50 g + 50 ml sulphuric acid / soaking: 2 wk. / drying on hot plate (very light Naples yellow [light green tone]) / irradiated with gamma rays at 70.4 Mrad<br>(followed at «light creamy yellow [localized green tone and green tone with orange reflection]») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «Naples yellow») |
| greenish Naples yellow | 2976 | powder finely grinded and heated 0↑1100 °F<br>(followed at «Naples yellow») |
| | | production process:<br>(followed from «light Naples yellow» and «greenish Naples yellow»)<br>powder finely grinded and heated at: |
| greenish Naples yellow<br>↓ | 2977 | 1100 °F / 1 h |
| Naples yellow (green tone a bit more accentuated)<br>↓ | 2978 | 1200 °F / 1 h<br><br>(followed at «Naples yellow») |
| Naples yellow (green tone a bit more accentuated) | 2979 | 1300 °F / 1 h[457]<br>(followed at «yellow more accentuated than "light yellow"» and «very light brownish grey, with metallic brilliance») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec |

| | | |
|---|---|---|
| greenish Naples yellow | 2980 | mineral : sulphur<br>rock : brilliant yellow<br>powder : brilliant yellow<br>origin : unknown<br><br>production process:<br>2 g of molybdenite + 2 g of sulphur / 1300 °F / 1 h |
| Naples yellow (accentuated green tone) darker than «Naples yellow (green tone)» | 2981 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>powder finely grinded and heated at 1100 °F / 1 h (greenish Naples yellow) / irradiated with gamma rays at 64.7 Mrad<br><br>(followed at «medium olive-green [grey tone]») |
| Naples yellow (accentuated green tone) darker than «Naples yellow (green tone)» | 2982 | production process:<br>powder heated at 1100 °F / 1 h (greenish Naples yellow) / irradiated with electrons at 302,831 rad[36,458] |
| greenish Naples yellow (pinkish orange tone) | | |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : sulphur<br>rock : brilliant yellow<br>powder : brilliant yellow<br>origin : unknown<br><br>production process:<br>2 g of molybdenite + 2 g of sulphur / 1300 °F / 1 h (greenish Naples yellow) / irradiated with gamma |

| | | |
|---|---|---|
| greenish Naples yellow (orange or pink tone) a bit more accentuated than «greenish Naples yellow (pinkish orange tone)» ↓ | 2983 | rays at: 64.7 Mrad |
| greenish Naples yellow darker [brown] still more accentuated and a bit less pinkish | 2984 | 424.7 Mrad |
| Naples yellow (orange tone) | | |
| light Naples yellow (light orange reflection) | 2985 | mineral : antigorite<br>rock : pale yellowish green<br>powder : very pale greenish yellow<br>origin : Canadian Refractories Mine, Kilmar, Québec<br><br><u>production process:</u><br>2 g of antigorite + 20 ml hydrochloric acid / soaking: 3 d. / drying on hot plate (light yellow [orange tone]) / irradiated with electrons at 302,831 rad[36] |
| Naples yellow (beige tone) | | |
| Naples yellow (beige tone) a bit darker than «Naples yellow darker than "very light Naples yellow (beige tone)"» | 2986 | mineral : sulphur<br>rock : brilliant yellow<br>powder : brilliant yellow<br>origin : unknown<br><br><u>production process:</u><br>(followed from «Naples yellow a bit darker than "very light Naples yellow"»)<br>.50 g of sulphur + .50 g of sodium carbonate (very light yellow [Naples yellow type]) / irradiated with electrons at 302,831 rad[45] |
| greyish Naples yellow | | |
| | | mineral : tellurium<br>powder : dark metallic grey |

| | | |
|---|---|---|
| | | origin : Minéraux Noranda Inc., lot 64, Montréal, Québec<br><br>production process:<br>3 g of tellurium + 5 g of pyrex / manual grinding / heated: 5 °C per min.: 0↑1245 °C + maintenance during 1 h / cooling: 5 °C per min. to ambient air / the entity in ambient air (light Naples yellow) / irradiated with gamma rays at 4.94 Mrad (followed at «light metallic grey [blue reflection]») |
| Naples yellow (bluish grey tone) darker than «light Naples yellow (bluish grey tone)» | 2986.1 | |
| yellow | | |
| very, very pale yellow | 2987 | mineral : fluorescent calcite<br>rock : white (localized grey or brown reflection), translucid<br>powder : white (yellow reflection)<br>origin : Bancroft, Ontario<br><br>production process:<br>powder irradiated with gamma rays at 65.704 Mrad (followed at «light creamy yellow») |
| very pale yellow | 2988 | mineral : microcline<br>rock : white (grey reflection)<br>powder : white (grey reflection)<br>origin : Buckingham, Québec<br><br>production process:<br>4 g of microcline + 80 ml hydrochloric acid / soaking: 2 wk. / drying on hot plate (very light yellow) / irradiated with electrons at 302,831 rad[36] |
| pale yellow<br>↓ | 2989 | mineral : chrome<br>powder : light grey, with metallic brilliance<br><br>mineral : cement[454]<br>powder : grey<br>origin : Lafarge Canada Inc., Québec<br><br>production process:<br>1 g of chrome + 27.40 g of cement + 13 cc of water / manual grinding / moulding / hardening / 0↑1300 °F[460] |
| pale yellow | 2990 | 1 g of chrome + 27.40 g of cement + 13 cc of water / manual grinding / moulding / hardening / 0↑1400 °F[460]<br><br>(followed at «pale green») |

| | | |
|---|---|---|
| pale yellow | 2991 | mineral : orthoclase<br>rock : white (grey reflection)<br>powder : white (grey reflection)<br>origin : mine near Buckingham, Papineau county, Québec<br><br>production process:<br>(followed from «light ivory»)<br>2 g of orthoclase + 20 ml sulphuric acid / soaking: 3 d. / drying on hot plate (mixture of particles: white / brown): .3 g + 50 cc of transparent polyester resin + 1% of catalyst / manual grinding / moulding / hardening (very light grey [light yellow reflection]) / irradiated with electrons at 305,082 rad[354] |
| yellow a bit more accentuated and dark than «pale yellow» | 2992 | mineral : apatite<br>rock : light grass-green (light blue and yellow tones), very slightly translucid<br>powder : very light grey (light green tone)<br>origin : region of Buckingham, Québec<br><br>production process:<br>(followed from «ivory [beige tone]»)<br>3 g of apatite + 20 ml sulphuric acid / soaking: 3 d. / drying on hot plate (very light brownish grey): .3 g + 50 cc of transparent polyester resin + 1% of catalyst / manual grinding / moulding / hardening (pale yellow) / irradiated with electrons at 305,082 rad[354] |
| very, very light yellow | 2993 | mineral : asbestos[4]<br>rock : dark grey (green reflection)<br>powder : light grey (green reflection)<br>origin : Asbestos Corporation Ltd., Thetford Mines, Québec<br><br>production process:<br>5 g of asbestos + 100 ml sulphuric acid / soaking: 2 wk. / drying on hot plate (almost pure white [yellow reflection]) / irradiated with gamma rays at 190.22 Mrad<br>(followed at «medium milky chocolate-brown [light grey tone]») |
| | | mineral : gypsum<br>rock : white (yellow reflection)<br>powder : white (yellow reflection)<br>origin : Geisborough, Nova Scotia |

| | | |
|---|---|---|
| very, very light yellow | 2994 | production process:<br>rock entirely covered with hydrochloric acid / soaking: 2 wk. / irradiated with gamma rays at 5.7 Mrad / drying on sand bath, completed on hot plate |
| very, very light yellow | 2995 | production process:<br>(followed from «white [yellow or beige reflection]»)<br>rock irradiated with electrons at 305,200 rad[73] |
| very, very light yellow | 2996 | mineral : polylithionite<br>rock : transparent (beige reflection)<br>powder : transparent (beige reflection)<br>origin : De-Mix quarry, North side of Mont Saint-Hilaire, Rouville county, Québec<br><br>production process:<br>(followed from «beige reflection»)<br>powder irradiated with gamma rays at 424.7 Mrad[45,461] |
| very, very light yellow | 2997 | mineral : iron pyrite<br>powder : greyish brown, with golden yellow metallic brilliance<br>origin : Rigaud seigniory, Beauce county, Québec<br><br>production process:<br>4 g of pyrite + 20 ml phosphoric acid / soaking: 3 d. / drying on hot plate (still humid) |
| very, very light yellow | 2998 | mineral : steatite<br>rock : light evergreen<br>powder : white<br>origin : East Broughton, Québec<br><br>production process:<br>2 g de steatite + 20 ml hydrofluoric acid / soaking: 24 h / drying in oven at 100 °F (white) / irradiated with gamma rays at 63.88 Mrad (followed at «medium beige») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec |

| | | |
|---|---|---|
| very light yellow | 2998.1 | <u>production process:</u><br>grinded until a fine powder / 0↑1300 °F + 4 h at 1300 °F (yellow more accentuated than «light yellow»): 1 g is sprinkled on the round end of a pyrex test tube, heated until melted with an oxyacetylene torch / the pigment adheres and the entity is immediately brought back to the state of fusion with the torch / immediate[1271] cooling in ambient air |
| very light yellow | 2999 | mineral : apatite<br>rock : medium brownish red<br>powder : light pinkish beige<br>origin : Ile Calumet, Pontiac county, Québec<br><br><u>production process:</u><br>3 g of apatite + 25 ml nitric acid / soaking: 3 d. / drying on hot plate |
| very light yellow | 3000 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br><u>production process:</u><br>3 g of apatite + 20 ml hydrochloric acid / soaking: 3 d. / drying on hot plate |
| very light yellow | 3001 | mineral : chalcopyrite<br>powder : dark grey (light green tone)<br>origin : Centre de recherche des Mines Noranda in Montréal, Québec<br><br><u>production process:</u><br>(followed from «grey a bit lighter than "light grey"»)<br>4 g of chalcopyrite + 100 ml sulphuric acid / soaking: 4 wk. / drying on hot plate |
| very light yellow | 3002 | mineral : cryolite<br>rock : white, crystalline and translucid<br>powder : white<br>origin : Ivigtut, Groenland<br><br><u>production process:</u><br>4 g of cryolite + 50 ml hydrochloric acid / soaking: 2 wk. / drying on hot plate (white [light yellow reflection]) / irradiated with gamma rays |

515

| | | |
|---|---|---|
| | | at 64.7 Mrad<br>(followed at «mixture of particles: beige [orange tone] / greyish brown») |
| very light yellow | 3003 | production process:<br>0↑1600 °F (white [with yellowish areas]): .20 g + 50 ml hydrochloric acid / soaking: 2 wk. / drying on hot plate |
| very light yellow | 3004 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml ether / natural drying |
| very light yellow | 3005 | production process:<br>2 g of fluorine + 20 ml ammonia / natural drying |
| very light yellow | 3006 | mineral : calcite[11]<br>powder : white<br>origin : Calcite du Nord Company, Saint-Eugène de Mistassini, Lac Saint-Jean, Québec<br><br>mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>1 g of calcite + 1 g of fluorine / 1000 °C / 1 h |
| very light yellow | 3007 | mineral : microcline<br>rock : white (grey reflection)<br>powder : white (grey reflection)<br>origin : Buckingham, Québec<br><br>production process:<br>4 g of microcline + 80 ml hydrochloric acid / soaking: 2 wk. / drying on hot plate |
| | | mineral : pentlandite[23]<br>rock : dark iron-grey, with silver and golden yellow metallic brilliance<br>powder : dark iron-grey (pronounced brown |

| | | |
|---|---|---|
| very light yellow | 3008 | tone)<br>origin : Inco Co., Sudbury, Ontario<br><br>production process:<br>0↑1900 °F (dark iron-grey): .50 g + 50 ml sulphuric acid / soaking: 2 wk. / drying on hot plate (light yellowish cream [light grey tone]) / irradiated with gamma rays at 70.4 Mrad<br>(followed at «dark greyish beige») |
| yellow a bit more accentuated than «very light yellow» | 3009 | mineral : cryolite<br>rock : white, crystalline and translucid<br>powder : white<br>origin : Ivigtut, Groenland<br><br>production process:<br>0↑1600 °F (white [with yellowish areas]): .20 g + 50 ml hydrochloric acid / soaking: 2 wk. / drying on hot plate (very light yellow) / irradiated with gamma rays at 64.7 Mrad<br>(followed at «dark milky chocolate-brown [orange tone]») |
| yellow more pale than «light yellow» | 3010 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>1 g of analcime + 50 ml hydrochloric acid / soaking: 2 wk. / drying on hot plate (light and vivid lemon-yellow) / irradiated with electrons at 164,800 rad<br>(followed at «very light creamy yellow») |
| light yellow | 3011 | mineral : asbestos[4]<br>rock : dark grey (green reflection)<br>powder : light grey (green reflection)<br>origin : Asbestos Corporation Ltd., Thetford Mines, Québec<br><br>production process:<br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]) / 100 °F / 1 h[462,463,464]<br>(followed at «yellow [orange tone]») |

| | | |
|---|---|---|
| light yellow | 3012 | production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) / irradiated with gamma rays at 63.984 Mrad<br>(followed at «light beige [orange tone]») |
| light yellow | 3013 | mineral : asbestos[4]<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Montréal, Québec<br><br>production process:<br>(followed from «very light yellowish grey»)<br>50 g of asbestos + 200 ml hydrochloric acid or asbestos entirely covered with hydrochloric acid / soaking: 1 wk. / drying on hot plate (vivid yellow): .50 g + .50 g zirconium silicate (very light yellowish grey) / irradiated with gamma rays at 254.204 Mrad<br>(followed at «pale brown») |
| light yellow | 3014 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>4 g of analcime + 200 ml hydrochloric acid / soaking: 4 yrs. / drying on hot plate[465] |
| light yellow | 3015 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>3 g of apatite + 20 ml nitric acid / soaking: 3 d. |

518

| | | |
|---|---|---|
| | | / drying on hot plate[466] |
| light yellow | 3016 | mineral : barite<br>rock : pinkish white<br><br>powder : white<br>origin : Niobec Mine, Saint-Honoré, Saguenay, Québec<br><br>production process:<br>4 g of barite + 50 ml nitric acid / soaking: 2 wk. / drying on hot plate (white [light yellow reflection]) / irradiated with gamma rays at 64.7 Mrad[467] |
| light yellow | 3017 | production process:<br>4 g of barite + 50 ml hydrochloric acid / soaking: 2 wk. / drying on hot plate (very light cream [light orange tone]) / irradiated with gamma rays at 64.7 Mrad<br>(followed at «medium greyish beige») |
| light yellow | 3018 | mineral : beryl<br>rock : light blue, slightly translucid<br>powder : light grey<br>origin : Abitibi, Québec<br><br>production process:<br>(followed from «light beige»)<br>2 g of beryl + 25 ml sulphuric acid / soaking: 24 h / drying on hot plate (very light greyish beige): .3 g + 50 cc of transparent polyester resin + 1% of catalyst / manual grinding / moulding / hardening (light brownish grey) / irradiated with electrons at 305,082 rad[354] |
| light yellow | 3019 | mineral : beryl<br>rock : very light yellowish green, slightly translucid<br>powder : white (green reflection)<br>origin : Lacorne district, Abitibi, Québec<br><br>production process:<br>powder irradiated with gamma rays at 124.7 Mrad[433]<br>(followed at «light beige [pink tone with orange reflection]») |
| | | mineral : calcite[11]<br>powder : white<br>origin : Calcite du Nord Company, Saint-Eugène de Mistassini, Lac Saint-Jean, Québec<br><br>mineral : chrome |

| | | |
|---|---|---|
| light yellow | 3020 | powder : light grey, with metallic brilliance<br><br>production process:<br>(followed from «white [yellow reflection]»)<br>1.50 g of calcite + .50 g of chrome / 1300 °F / 1 h<br>(followed at «greenish yellow» and «very light green [nearing beige]») |
| light yellow | 3021 | mineral : fluorescent calcite<br>rock : white (localized grey and brown reflection), translucid<br>powder : white (yellow reflection)<br>origin : Bancroft, Ontario<br><br>production process:<br>4 g of calcite + 20 ml nitric acid / soaking: 3 d. / separation of the liquid and the solid / drying on hot plate / colour of the liquid[77,468] |
| light yellow | 3022 | mineral : zinc concentrate, grilled at 1000 °C $(ZnO\text{-}FeO)(SO_4)$<br>powder : reddish brown<br>origin : Zinc Electrolytic of Canada Co., Québec<br><br>production process:<br>4 g of concentrate + 100 ml sulphuric acid[469] / soaking: 1 wk. / drying on hot plate |
| yellow still lighter | 3023 | 4 g of concentrate + 100 ml sulphuric acid / soaking: 2 wk. / drying on hot plate |
| yellow still lighter | 3024 | 4 g of concentrate + 100 ml sulphuric acid / soaking: 3 wk. / drying on hot plate |
| ↓ light yellow | 3025 | 4 g of concentrate + 100 ml sulphuric acid / soaking: 4 wk. / drying on hot plate[470] |
| light yellow | 3026 | mineral : cryolite<br>rock : white, crystalline and translucid<br>powder : white<br>origin : Ivigtut, Groenland<br><br>production process:<br>rock entirely covered with 20 ml hydrochloric acid / soaking: 2 wk. / irradiated with gamma rays at 5.7 Mrad / drying on sand bath, completed on hot plate[471] |

520

| | | |
|---|---|---|
| light yellow | 3027 | mineral : dolomite<br>rock : white (localized yellow reflection), crystalline and translucid<br>powder : white<br>origin : Bristol district, Pontiac county, Québec<br><br>production process:<br>rock entirely covered with 20 ml hydrochloric acid / soaking: 2 wk. / irradiated with gamma rays at 5.7 Mrad / drying on sand bath, completed on hot plate |
| light yellow | 3028 | production process:<br>2 g of dolomite + 25 ml hydrochloric acid / soaking: 24 h / drying on hot plate |
| light yellow | 3029 | mineral : kaolin<br>rock : chalk-white (yellow reflection)<br>powder : chalk-white (yellow reflection)<br>origin : Saint-Rémi d'Amherst, Québec<br><br>production process:<br>rock entirely covered with 20 ml hydrochloric acid / soaking: 2 wk. / irradiated with gamma rays at 5.7 Mrad / drying on sand bath, completed on hot plate |
| light yellow | 3030 | mineral : labradorite<br>rock : bluish green<br>powder : light grey (light green tone)<br>origin : Chicoutimi county, Québec<br><br>production process:<br>2 g of labradorite + 25 ml nitric acid / soaking: 24 h / drying on hot plate |
| light yellow | 3031 | mineral : iron pyrite<br>powder : greyish brown, with golden yellow metallic brilliance<br>origin : Rigaud seigniory, Beauce county, Québec<br><br>production process:<br>4 g of pyrite + 20 ml phosphoric acid / soaking: 3 d. / drying on hot plate (still humid) |
| | | mineral : sphalerite[27]<br>rock : dark grey, with golden yellow metallic brilliance<br>powder : dark brownish grey<br>origin : Matagami Mine, Matagami, Québec |

521

| | | |
|---|---|---|
| light yellow | 3032 | production process:<br>0↑1800 °F (medium chocolate-brown): 1 g + 50 ml sulphuric acid / soaking: 2 wk. / drying on hot plate (white) / irradiated with electrons at 162,431 rad<br>(followed at «very light greenish yellow») |
| light yellow | 3033 | production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) liquid (2nd) at the surface; b) layer between a) and b): mixture of the liquid and the solid; c) solid resting at the bottom of the solution / natural drying (colour of c) the residual solid: light yellow [very light green tone]) / the residual solid is irradiated with electrons at 162,431 rad |
| light yellow | 3034 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>rock heated 0↑1400 °F + 6 h at 1400 °F / progressive formation of crystals at the surface of the mineral at the state of a rock / removal of these crystals / colour of the crystals[472] |
| light yellow | 3035 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Montréal, Québec<br><br>production process:<br>50 g of asbestos + 200 ml hydrochloric acid <u>or</u> asbestos entirely covered with hydrochloric acid / soaking: 1 wk. / drying on hot plate (vivid yellow): .50 g + .50 g of titanium dioxide |
| | | mineral : serpentine<br>rock : yellowish green<br>powder : light greenish yellow |

| | | |
|---|---|---|
| light yellow | 3036 | origin : probably Thetford Mines, Eastern Townships, Québec<br><br>production process:<br>3 g of serpentine + 25 ml nitric acid / soaking: 24 h / separation of the liquid and the solid / colour of the liquid[1020] |
| light and intense yellow | 3037 | production process:<br>rock entirely covered with 20 ml hydrochloric acid / soaking: 2 wk. / irradiated with gamma rays at 5.7 Mrad / drying on sand bath, completed on hot plate[473] |
| yellow very, very slightly more accentuated than «light yellow»<br>↓ | 3038 | mineral : sulphur<br>rock : brilliant yellow<br>powder : brilliant yellow<br>origin : unknown<br><br>mineral : zirconium oxide<br>powder : light beige<br>origin : Tam Ceramic Inc., Montréal, Québec<br><br>production process:<br>.50 g of sulphur + .50 g of zirconium oxide (light creamy yellow) / irradiated with electrons at:<br>162,431 rad |
| lighter yellow | 3039 | 302,831 rad[45] |
| yellow a bit more intense than «light yellow» | 3040 | mineral : sulphur<br>rock : brilliant yellow<br>powder : brilliant yellow<br><br>production process:<br>powder irradiated with gamma rays at 64.7 Mrad[89]<br><br>(followed at «lemon-yellow») |
| yellow a bit more intense and luminous than «light yellow» | 3041 | production process:<br>powder irradiated with electrons at 302,831 rad[36] |
| | | mineral : apatite<br>rock : medium brownish red<br>powder : light pinkish beige<br>origin : Ile Calumet, Pontiac county, Québec |

523

| | | |
|---|---|---|
| | | production process: 3 g of apatite + 25 ml nitric acid / soaking: 3 d. / drying on hot plate (very light yellow): .4 g + 1 cc of transparent printing ink / manual grinding / 8 superimpositions on glazed white paper (light cream) / irradiated with gamma rays at: |
| yellow a bit more intense than «light yellow» | 3042 | 5.7 Mrad |
| yellow a bit more intense than «light yellow» | 3043 | 11.4 Mrad |
| ↓ | | |
| yellow a bit more intense than «light yellow» | 3044 | 22.8 Mrad |
| | | mineral : asbestos[4]<br>rock : dark grey (green reflection)<br>powder : light grey (green reflection)<br>origin : Asbestos Corporation Ltd., Thetford Mines, Québec |
| | | mineral : titanium dioxide<br>powder : white<br>origin : NL Chem Canada Inc., Montréal, Québec |
| yellow a bit more accentuated than «light yellow» | 3045 | production process: 50 g of asbestos + 200 ml hydrochloric acid or asbestos entirely covered with hydrochloric acid / soaking: 1 wk. / drying on hot plate (vivid yellow): .50 g + .50 g of titanium dioxide (light yellow) / irradiated with electrons at 164,800 rad |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec |
| | | production process: (followed from «Naples yellow») powder finely grinded and heated: |
| yellow more accentuated than «light yellow» | 3046 | 0↑1300 °F |
| ↓ | | |
| yellow still more accentuated | 3047 | 0↑1300 °F + 4 h at 1300 °F (followed at «light metallic grey») |

| | | |
|---|---|---|
| | | mineral : asbestos[4]<br>rock : dark grey (green reflection)<br>powder : light grey (green reflection)<br>origin : Asbestos Corporation Ltd., Thetford Mines, Québec |
| | | production process: |
| yellow and orange of various tones | 3048 | 0↑1000 °F (grey [light beige tone]): 3 g + 25 ml hydrochloric acid / soaking: 3 mo. / drying on hot plate[474] |
| | 3049 | 0↑1100 °F (chamois [light grey tone]): 3 g + 25 ml hydrochloric acid / soaking: 3 mo. / drying on hot plate[474] |
| | 3050 | 0↑1200 °F (chamois): 3 g + 25 ml hydrochloric acid / soaking: 3 mo. / drying on hot plate[474] |
| | 3051 | 0↑1300 °F (chamois a bit more accentuated): 3 g + 25 ml hydrochloric acid / soaking: 3 mo. / drying on hot plate[474] |
| | 3052 | 0↑1500 °F (chamois [light orange tone]): 3 g + 25 ml hydrochloric acid / soaking: 3 mo. / drying on hot plate[474] |
| | 3053 | 0↑1600 °F (chamois [slightly more orange]): 3 g + 25 ml hydrochloric acid / soaking: 3 mo. / drying on hot plate[474] |
| | 3054 | 0↑1900 °F (chamois [still lightly more orange]): 3 g + 25 ml hydrochloric acid / soaking: 3 mo. / drying on hot plate[474] |
| | 3055 | 0↑2000 °F (darker charmois [orange tone]): 3 g + 25 ml hydrochloric acid / soaking: 3 mo. / drying on hot plate[474] |
| | 3056 | 0↑2100 °F (still darker chamois [orange tone]): 3 g + 25 ml hydrochloric acid / soaking: 3 mo. / drying on hot plate[474] |
| | 3057 | 0↑2200 °F (still darker chamois [orange tone]): 3 g + 25 ml hydrochloric acid / soaking: 3 mo. / drying on hot plate[474] |
| ↓ | 3058 | 0↑2300 °F (still a bit darker chamois [orange tone]): 3 g + 25 ml hydrochloric acid / soaking: 3 mo. / drying on hot plate[474] |

| | | |
|---|---|---|
| | | mineral : galena<br>rock : dark grey, with metallic brilliance<br>powder : dark grey, with metallic brilliance<br>origin : Trail, British Columbia<br><br>production process: |
| areas: yellow / brown / grey<br>↓ | 3058.1 | .45 g of galena is sprinkled at the surface of 150 g of molten glass (sodalime), collected at the state of fusion in the furnace (1200 °C) on a metal rod / then, the entity is put back in the furnace and melted with the flame at 1200 °C / then, the «collect» is taken off the rod (opaque glaze, mat and lustrous: dark olive-green [with «metallic grey» reflections]) / 0↑1000 °C / slow cooling in the furnace |
| areas: yellow / brown / grey | 3058.2 | 1 g of galena is sprinkled at the surface of 150 g of molten glass (sodalime), collected at the state of fusion in the furnace (1200 °C) on a metal rod / then, the entity is put back in the furnace and melted with the flame at 1200 °C / then, the «col-lect» is taken off the metal rod (opaque glaze, mat and lustrous: dark olive-green [with metallic grey reflections]) / 0↑1000 °C / slow cooling in the furnace |
| | | mineral : barite<br>rock : pinkish white<br><br>powder : white<br>origin : Niobec Mine, Saint-Honoré, Saguenay, Québec<br><br>production process:<br>(followed from «cristalline white [yellow reflection]») |
| yellow | 3059 | rock irradiated with gamma rays at 244.53 Mrad |
| | | mineral : calcite<br>rock : light pink<br>powder : pinkish white<br>origin : Huddersfield district, Pontiac county, Québec<br><br>production process: |
| yellow | 3060 | rock entirely covered with 20 ml hydrochloric acid / soaking: 2 wk. / irradiated with gamma rays at 5.7 Mrad / drying on sand bath, completed on hot plate |
| | | mineral : fluorine<br>rock : very light yellow, translucid<br>powder : white (light yellow reflection)<br>origin : Saint-Lawrence Fluorspar Company, Saint-Lawrence, Newfoundland |

| | | |
|---|---|---|
| yellow | 3061 | production process:<br>2 g of fluorine + 20 ml hydrochloric acid / soaking: 3 d. / drying on hot plate |
| yellow | 3062 | mineral : halite[41]<br>rock : colourless<br>powder : colourless<br>origin : Seleine Mine, Iles-de-la-Madeleine, Québec<br><br>production process:<br>rock irradiated with a UV laser with 10 shots on a surface of 0.6 $cm^2$ with a laser energy of 0.210 Joules which has a flux of 1.2 x $10^7$ W / $cm^2$ to give a total energy of 2.2 Joules (followed at «brown tint») |
| yellow<br>↓ | 3063 | mineral : galena<br>rock : dark grey, with metallic brilliance<br>powder : dark grey, with metallic brilliance<br>origin : Trail, British Columbia<br><br>mineral : cement[1138]<br>powder : white<br><br>production process:<br>27.40 g of cement + 13 cc of water / manual grinding / hardening / 1 g of galena deposited at the surface of a dried piece of cement / 0↑1900 °F[280] |
| yellow / beige | 3064 | 27.40 g of cement + 13 cc of water / manual grinding / moulding / hardening / 1 g of galena deposited on a piece of dried cement / 0↑1900 °F (yellow) / irradiated with gamma rays at 18.85 Mrad[280] |
| yellow | 3065 | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>4 g of mica + 50 ml hydrochloric acid / soaking: 2 wk. / addition of 50 ml hydrochloric acid / soaking: 2 wk. / drying on hot plate[477] |

| | | |
|---|---|---|
| yellow | 3066 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>0↑1900 °F (mixture of particles: white [yellow reflection] / brown): .40 g + 50 ml nitric acid / soaking: 2 wk. / drying on hot plate[24,478] |
| yellow | 3067 | mineral : antigorite<br>rock : pale yellowish green<br>powder : very pale greenish yellow<br>origin : Canadian Refractories Mine, Kilmar, Québec<br><br>production process:<br>rock entirely covered with 20 ml hydrochloric acid / soaking: 2 wk. / irradiated with gamma rays at 5.7 Mrad / drying on sand bath, completed on hot plate |
| yellow | 3068 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>silica entirely covered with hydrochloric acid / soaking: 1 wk. / drying on hot plate |
| yellow | 3069 | production process:<br>silica entirely covered with hydrochloric acid / soaking: 5 mo. / natural drying |
| | | mineral : apatite<br>rock : medium brownish red<br>powder : light pinkish beige<br>origin : Ile Calumet, Pontiac county, Québec<br><br>production process:<br>3 g of apatite + 25 ml hydrochloric acid / soaking: 3 d. / drying on hot plate (mixture of |

| | | |
|---|---|---|
| | | particles: white / brown): 1 g + 1 cc of transparent printing ink / manual grinding / 8 superimpositions on glazed white paper (cream) / irradiated with gamma rays at: |
| yellow very slightly more accentuated than «yellow» ↓ | 3070 | 17.91 Mrad[90] |
| yellow very slightly more accentuated than «yellow» | 3071 | 22.8 Mrad |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «yellow [light green tone]») |
| yellow more accentuated than «yellow» ↓ | 3072 | 0↑1000 °F (grey [beige tone]): 5 g + 25 ml hydrochloric acid / soaking: 3 d. / drying on hot plate |
| yellow still more accentuated | 3073 | 0↑1200 °F (pinkish beige): 5 g + 25 ml hydrochloric acid / soaking: 3 d. / drying on hot plate (followed at «dark chamois») |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «vivid lemon-yellow») |
| strong yellow, intense and a bit stronger than «yellow» | 3074 | 50 g of asbestos + 200 ml hydrochloric acid or asbestos entirely covered with hydrochloric acid / soaking: 1 wk. / drying on hot plate (vivid yellow) / irradiated with gamma[239] rays at 140.4 Mrad (followed at «canary-yellow») |
| yellow more whitened and light than «vivid | 3075 | production process:<br>0↑1900 °F (chamois [orange tone a bit more accentuated than «light orange tone»]): 50 g + 200 ml hydrochloric acid or asbestos entirely covered |

| | | |
|---|---|---|
| yellow» | | with hydrochloric acid / soaking: 1 wk. / drying on hot plate (vivid sunny yellow [light green tone]) / irradiated with UV laser beam during 10 min. on a surface of 0.5 $cm^2$ with a laser energy of 0.180 Joules having a flux of 6.5 x $10^6$ W / $cm^2$ which gives a total energy of 1,080 Joules |
| vivid yellow | 3076 | production process: 50 g of asbestos + 200 ml hydrochloric acid or asbestos entirely covered with hydrochloric acid / soaking: 1 wk. / drying on hot plate[479] |
| vivid yellow | 3077 | mineral : solid epidote<br>rock : brownish green<br>powder : brownish green<br>origin : James Bay, Québec<br><br>production process:<br>0↑1700 °F (dark reddish brown): 1 g + 40 ml hydrochloric acid / soaking: 1 wk. / separation of the liquid and the solid / natural drying / colour of the liquid[24,264] |
| vivid yellow | 3078 | production process: 12 g of epidote + 40 ml hydrochloric acid / soaking 14 d. / separation of the liquid and the solid / natural drying / colour of the solid[480] |
| dark yellow | 3079 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>(followed from «light beige»)<br>.3 g of apatite + 50 cc of transparent polyester resin + 1% of catalyst / manual grinding / moulding / hardening (very light grey [light yellow reflection]) / irradiated with electrons at 305,082 rad[354] |
| | | mineral : halite[41]<br>rock : colourless<br>powder : colourless<br>origin : Seleine Mine, Iles-de-la-Madeleine, Québec |

| | | |
|---|---|---|
| dark yellow | 3080 | <u>production process:</u><br>(followed from «grey [beige tone]»)<br>2 g of halite + 20 ml hydrochloric acid / soaking: 3 d. / drying on hot plate (transparent white [light yellow reflection]): .3 g + 50 cc of transparent polyester resin + 1% of catalyst / manual grinding / moulding / hardening (very, very light grey [light yellow tone]) / irradiation with electrons at 305,082 rad[354] |
| mixture of particles | | |
| | | mineral : agate<br>rock : grey (with a light orange circular area on the surface), slightly translucid<br>powder : very light grey<br>origin : unknown<br><br><u>production process:</u><br>3 g of agate + 40 ml hydrochloric acid / soaking: 1 wk. / separation of the liquid and the solid / natural drying (colour of the solid: white) / irradiated with electrons at: |
| light yellow / white | 3081 | 164,800 rad |
| ↓ | | |
| light yellow / white | 3082 | 305,200 rad[73] |
| light and vivid yellow / vivid and light orange / white more pure than «white (green reflection)» | 3083 | <u>production process:</u><br>3 g of agate + 40 ml nitric acid / soaking: 1 wk. / separation of the liquid and the solid / natural drying (colour of the solid: white [green reflection]) / irradiated with electrons at 305,200 rad[46] |
| canary-yellow | | |
| | | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>(followed from «brownish orange») |
| canary-yellow [between | 3084 | 0↑750 °F (medium salmon): 3 g + 20 ml hydrochloric acid / soaking: 3 d. / drying on hot plate |

| | | |
|---|---|---|
| «orange ochre» and «canary-yellow»] ↓ vivid canary-yellow | 3085 | 0†1000 °F(medium salmon [tone more pinkish than at 750 °F]): 3 g + 20 ml hydrochloric acid / soakig: 3 d. / drying on hot plate (followed at «orange») |
| very vivid canary-yellow | 3086 | mineral : bornite<br>rock : reddish brown (with localized green and bluish green oxidation)<br>powder : reddish brown<br>origin : Lac Musset, Fosse du Labrador, Québec<br><br>production process:<br>(followed from «intense emerald-green», «very, very vivid apple-green» and «lime-green»)<br>3 g of bornite + 50 ml hydrochloric acid / soaking: 6 d. / separation of the liquid and the solid / natural drying / colour of the solid |
| canary-yellow more intense than «vivid canary-yellow» | 3087 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «strong yellow, intense»)<br>50 g of asbestos + 200 ml hydrochloric acid or asbestos entirely covered with hydrochloric acid / soaking: 1 wk. / drying on hot plate (vivid yellow) / irradiated with gamma rays at 201.6 Mrad (followed at «yellow [light orange tone]») |
| lemon-yellow | | |
| lemon-yellow more intense than «pale lemon-yellow» | 3088 | mineral : apatite<br>rock : reddish brown<br>powder : light pinkish beige<br>origin : Calumet, Pontiac county, Québec<br><br>production process:<br>(followed from «yellow [ivory tone]»)<br>3 g of apatite + 20 ml sulphuric acid / soaking: 3 d. / drying on hot plate (light brown): .2 g + 50 cc of transparent polyester resin + 1% of catalyst / manual grinding / moulding / hardening (pale lemon-yellow) / irradiated with electrons at 305,082 rad[354] |

532

| | | |
|---|---|---|
| lemon-yellow darker than «pale lemon-yellow» | 3089 | production process:<br>3 g of apatite + 20 ml sulphuric acid / soaking: 3 d. / drying on hot plate (light brown): .2 g + 50 cc of transparent polyester resin + 1% of catalyst / manual grinding / moulding / hardening (pale lemon-yellow) / irradiated with gamma rays at 11.4 Mrad |
| lemon-yellow more accentuated than «very light lemon-yellow» | 3090 | mineral : microcline<br>rock : white (grey reflection)<br>powder : white (grey reflection)<br>origin : Buckingham, Québec<br><br>production process:<br>4 g of microcline + 80 ml hydrochloric acid / soaking: 2 wk. / drying on hot plate (very light yellow) / irradiated with gamma rays at 64.7 Mrad (followed at «mixture of particles: beige [orange tone] / greyish beige») |
| lemon-yellow more intense and a bit darker than «very light lemon-yellow» | 3091 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>(followed from «light brown [yellow tone]»)<br>3 g of apatite + 20 ml nitric acid / soaking: 3 d. / drying on hot plate (light yellow): .3 g + 50 cc of transparent polyester resin + 1% of catalyst / manual grinding / moulding / hardening (very light lemon-yellow) / irradiated with electrons at 305,082 rad[354] |
| lemon-yellow more intense and a bit darker than «very light lemon-yellow» | 3092 | mineral : obsidian<br>rock : very dark smoky grey, almost black<br>powder : light grey<br>origin : Arkansas, United States<br><br>production process:<br>(followed from «beige [yellow tone]»)<br>2 g of obsidian + 20 ml sulphuric acid / soaking: 3 d. / drying on hot plate (medium greyish brown): .3 g + 50 cc of transparent polyester resin + 1% of catalyst / manual grinding / moulding / hardening (very light lemon-yellow) / irradiated with electrons at 305,082 rad[354] |

| | | |
|---|---|---|
| | | mineral : chalcopyrite<br>rock : brass-yellow, with metallic luster<br>powder : dark grey (with golden particles)<br>origin : Noranda Mines, Noranda, Abitibi, Québec |
| | | production process:<br>(followed from «dark brown»)<br>2 g of chalcopyrite + 2 g of sodium carbonate: |
| light lemon-yellow | 3094 | 0↑1500 °F + 1 h at 1500 °F |
| ↓ more intense lemon-yellow | 3095 | 0↑1600 °F + 1 h at 1600 °F |
| ↓ lemon-yellow still more intense | 3096 | 0↑1700 °F + 1 h at 1700 °F |
| ↓ lemon-yellow still more intense | 3097 | 0↑1800 °F + 1 h at 1800 °F |
| ↓ lemon-yellow still more intense | 3098 | 0↑1900 °F + 1 h at 1900 °F |
| | | mineral : halite[41]<br>rock : colourless<br>powder : colourless<br>origin : Seleine Mine, Iles-de-la-Madeleine, Québec |
| light lemon-yellow | 3099 | production process:<br>rock irradiated with electrons at 162,431 rad (light bluish grey), then at 164,800 rad (followed at «yellow ochre») |
| light lemon-yellow | 3100 | production process:<br>rock irradiated with electrons at 164,800 rad (light bluish grey), then at 155,082 rad (followed at «yellow ochre») |
| light lemon-yellow | 3101 | production process:<br>rock irradiated with electrons at 164,800 rad (light bluish grey), then at 140,400 rad (followed at «yellow ochre») |
| light lemon-yellow | 3102 | production process:<br>rock irradiated with electrons at 162,431 rad (light bluish grey), then at 140,400 rad (followed at «yellow ochre») |

534

| | | |
|---|---|---|
| light lemon-yellow | 3103 | mineral : kaolin<br>rock : chalk-white (yellow reflection)<br>powder : chalk-white (yellow reflection)<br>origin : Saint-Rémi d'Amherst, Québec<br><br>production process:<br>3 g of kaolin + 50 ml hydrochloric acid / soaking: 2 wk. / drying on hot plate |
| light lemon-yellow | 3104 | mineral : peridotite<br>rock : medium grey<br>powder : medium brownish grey (green reflection)<br>origin : Thetford Mines, Québec<br><br>production process:<br>4 g of peridotite + 100 ml hydrochloric acid / soaking: 2 wk. / separation of the liquid and the solid / drying on hot plate / colour of the liquid[537a] |
| 3 areas: light lemon-yellow / greyish brown more or less dark / white slightly milky | 3104.1 | mineral : tellurium<br>powder : dark metallic grey<br>origin : Minéraux Noranda Inc., lot 64, Montréal, Québec<br><br>production process:<br>2 g of tellurium + 6.50 g of powdered glass (spruce pine batch) / manual grinding / deposited on a plate of ceramic at the state of a biscuit / heated in a furnace 0↑1000 °C in ambient air / slow cooling in furnace |
| light lemon-yellow | 3105 | mineral : sulphur<br>rock : brilliant yellow<br>powder : brilliant yellow<br>origin : unknown<br><br>mineral : zirconium oxide<br>powder : light beige<br>origin : Tam Ceramic Inc., Montréal, Québec<br><br>production process:<br>.50 g of sulphur + .50 g of zirconium oxide (light creamy yellow) / irradiated with gamma rays at 64.7 Mrad<br>(followed at «pale yellow ochre [brown tone and green reflection]») |
| | | mineral : spodumene<br>rock : pale green<br>powder : light grey, almost white |

| | | |
|---|---|---|
| light lemon-yellow | 3106 | origin : Québec Lithium Co., Baraute, Abitibi, Québec<br><br>production process:<br>2 g of spodumene + 80 ml hydrochloric acid / soaking: 2 wk. / drying on hot plate |
| light lemon-yellow | 3107 | mineral : stilbite<br>rock : white (honey-yellow reflection)<br>powder : white (honey-yellow reflection)<br>origin : Lac d'amiante Mine, Black Lake, Québec<br><br>production process:<br>3 g of stilbite + 40 ml hydrochloric acid / soaking: 28 d. / drying on hot plate (light creamy yellow) / irradiated with electrons at 305,200 rad[46] |
| light lemon-yellow | 3108 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «orange [beige tone] more pale than "light orange [beige tone]"») rock hermetically wrapped in bread dough / 1600 °F / 30 min. / cooling (blackish grey) / the bread dough is taken off and the rock is heated again 0↑1500 °F in ambient air (colour of the crystals at the surface of the rock: light Naples yellow): .3 g of crystals + 25 ml hydrochloric acid / natural drying / when dried, heated on hot plate / colour of the crystals |
| light lemon-yellow | 3108.1 | production process:<br>0↑1300 °F + 4 h at 1300 °F (yellow more accentuated than «light yellow»): 1 g is sprinkled at the surface of 150 g of molten glass (sodalime), which has been collected, at the state of fusion, in the furnace (1200 °C) on a metal rod / then, the entity is put back in the furnace and melted with the flame at 1200 °C / then, the «collect» is taken off the metal rod |
| | | mineral : zincite<br>rock : mixture of areas: dark grey / red (orange tone)<br>powder : medium milky chocolate-brown (red |

536

| | | |
|---|---|---|
| light lemon-yellow | 3109 | tone)<br>origin : Franklin, New Jersey, United States<br><br>production process:<br>4 g of zincite + 50 ml sulphuric acid / soaking: 2 wk. / drying on hot plate (creamy white [light orange reflection]) / irradiated with electrons at 162,431 rad<br>(followed at «vivid lemon-yellow») |
| light and vivid lemon-yellow | 3110 | mineral : analcime<br>rock : white (grey reflection), crystalline and translucide<br>powder : light grey<br>origin : De-Mix quarry, North side of Mont Saint-Hilaire, Rouville county, Québec<br><br>production process:<br>1 g of analcime + 50 ml hydrochloric acid / soaking: 2 wk. / drying on hot plate |
| light and vivid lemon-yellow | 3111 | mineral : chrysocolla<br>rock : light greenish turquoise<br>powder : very light greenish turquoise<br>origin : Mexico<br><br>production process:<br>2 g of chrysocolla + 25 ml hydrochloric acid / natural drying / colour of the solid[409] |
| lemon-yellow more intense than «light lemon-yellow» | 3112 | mineral : fluorine<br>rock : light pink, translucid<br>powder : white (light pink reflection)<br>origin : Saint-Lawrence Fluorspar Company, Saint-Lawrence, Newfoundland<br><br>production process:<br>(followed from «very light brown [light yellow tone]»)<br>2 g of fluorine + 20 ml sulphuric acid / soaking: 3 d. / drying on hot plate (very light beige): .2 g + 50 cc of transparent polyester resin + 1% of catalyst / manual grinding / moulding / hardening (light lemon-yellow) / irradiated with electrons at 305,082 rad[354] |
| | | mineral : serpentine<br>rock : yellowish green<br>powder : light greenish yellow<br>origin : probably Thetford Mines, Eastern Townships, Québec |

| | | |
|---|---|---|
| lemon-yellow more intense than «light lemon-yellow» | 3113 | production process: 3 g of serpentine + 25 ml nitric acid / soaking: 24 h / separation of the liquid and the solid / drying on hot plate (colour of the liquid: light yellow): .3 g + 50 cc of transparent polyester resin + 1% of catalyst / manual grinding / moulding / hardening (light lemon-yellow) / irradiated with gamma rays at 11.4 Mrad |
| | | production process: 3 g of serpentine + 25 ml nitric acid / soaking: 24 h / separation of the liquid and the solid / drying on hot plate (colour of the liquid: light yellow): .3 g + 50 cc of transparent polyester resin + 1% of catalyst / manual grinding / moulding / hardening (light lemon-yellow) / irradiated with electrons at: |
| lemon-yellow more accentuated than «light lemon-yellow» ↓ | 3114 | 155,082 rad |
| lemon-yellow much more accentuated than «light lemon-yellow» | 3115 | 305,082 rad[354] |
| | | mineral : stilbite<br>rock : white (honey-yellow reflection)<br>powder : white (honey-yellow reflection)<br>origin : Lac d'amiante Mine, Black Lake, Québec<br><br>production process: 3 g of stilbite + 40 ml hydrochloric acid / soaking: 28 d. / drying on hot plate (light creamy yellow) / irradiated with gamma rays at: |
| lemon-yellow more accentuated than «light lemon-yellow» ↓ | 3116 | 64.7 Mrad |
| lemon-yellow much more accentuated than «light lemon-yellow» | 3117 | 424.7 Mrad |
| | | mineral : chrysocolla |

| | | |
|---|---|---|
| lemon-yellow more intense than «light and vivid lemon-yellow» | 3118 | rock : light greenish turquoise<br>powder : very light greenish turquoise<br>origin : Mexico<br><br>production process:<br>2 g of chrysocolla + 25 ml hydrochloric acid / natural drying (colour of the solid: light and vivid lemon-yellow) / irradiated with gamma rays at 64.7 Mrad<br>(followed at «light beige [orange tone]») |
| lemon-yellow darker than «light lemon-yellow» | 3119 | mineral : spodumene<br>rock : pale green<br>powder : light grey, almost white<br>origin : Québec Lithium Co., Baraute, Abitibi, Québec<br><br>production process:<br>2 g of spodumene + 80 ml hydrochloric acid / soaking: 2 wk. / drying on hot plate (light lemon-yellow) / irradiated with gamma rays at 64.7 Mrad<br>(followed at «dark yellow ochre») |
| lemon-yellow | 3120 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) + 40 ml hydrochloric acid / soaking: 5 d. / separation of the liquid and the solid / drying on sand bath[481] / colour of the solid[481a] |
| lemon-yellow | 3121 | mineral : sulphur<br>rock : brilliant yellow<br>powder : brilliant yellow<br>origin : unknown<br><br>production process:<br>(followed from «yellow a bit more intense than "light yellow"»)<br>powder irradiated with gamma rays at 424.7 Mrad |
| | | mineral : stilbite<br>rock : white (honey-yellow reflection) |

| | | |
|---|---|---|
| lemon-yellow | 3122 | powder : white (honey-yellow reflection)<br>origin : Lac d'amiante Mine, Black Lake, Québec<br><br>production process:<br>(followed from «very, very light green»)<br>3 g of stilbite + 40 ml nitric acid / natural drying (white [green reflection]) / irradiated with gamma rays at 424.7 Mrad[228] |
| medium lemon-yellow | 3123 | mineral : analcime<br>rock : white (grey reflection), crystalline and translucide<br>powder : light grey<br>origin : De-Mix quarry, North side of Mont Saint-Hilaire, Rouville county, Québec<br><br>production process:<br>(followed from «grey a bit darker than "light grey"»)<br>powder irradiated with gamma rays at 244.53 Mrad (followed at «medium yellow ochre») |
| medium and vivid lemon-yellow | 3124 | mineral : tremolite<br>rock : medium brown (evergreen tone)<br>powder : greyish beige<br>origin : Tetreault Mine, Montauban, Portneuf county, Québec<br><br>production process:<br>6 g of tremolite + 50 ml hydrochloric acid / soaking: 2 wk. / drying on hot plate |
| medium lemon-yellow | 3125 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 50 ml sulphuric acid / soaking: 2 wk. / drying on hot plate (white [light yellow or beige reflection]) / irradiated with electrons at 162,431 rad |
| lemon-yellow a bit more pale than «vivid lemon-yellow» | 3126 | production process:<br>4 g of pyrrhotite + 50 ml nitric acid / soaking: 2 wk. / separation of the liquid and the solid / natural drying (colour of the liquid: vivid lemon-yellow) / irradiated with electrons at 302,831 rad[36,482] |

| | | |
|---|---|---|
| vivid lemon-yellow | 3127 | production process:<br>4 g of pyrrhotite + 50 ml nitric acid / soaking: 2 wk. / separation of the liquid and the solid / natural drying / colour of the liquid[140] |
| | | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow) / irradiated with gamma rays at: |
| vivid lemon-yellow ↓ | 3128 | 5 Mrad |
| vivid lemon-yellow ↓ | 3129 | 10 Mrad |
| vivid lemon-yellow ↓ | 3130 | 57.4 Mrad |
| vivid lemon-yellow ↓ | 3131 | 63.984 Mrad |
| vivid lemon-yellow | 3132 | 102.4 Mrad<br>(followed at «strong yellow, intense») |
| vivid lemon-yellow | 3133 | mineral : zincite<br>rock : mixture of areas: dark grey / red (orange tone)<br>powder : medium milky chocolate-brown (red tone)<br>origin : Franklin, New Jersey, United States<br><br>production process:<br>(followed from «light lemon-yellow»)<br>4 g of zincite + 50 ml sulphuric acid / soaking: 2 wk. / drying on hot plate (creamy white [light orange reflection]) / irradiated with electrons at 302,831 rad[45] |
| vivid and strong lemon-yellow | 3134 | mineral : tremolite<br>rock : medium brown (evergreen tone)<br>powder : greyish beige<br>origin : Tetreault Mine, Montauban, Portneuf county, Québec<br><br>production process:<br>6 g of tremolite + 80 ml hydrochloric acid / soaking: 4 yr. / drying on hot plate[483] |

| | | |
|---|---|---|
| lemon-yellow a bit darker than «vivid lemon-yellow» | 3135 | mineral : chalcopyrite<br>rock : brass-yellow, with metallic luster<br>powder : dark grey (with golden particles)<br>origin : Noranda Mines, Noranda, Abitibi, Québec<br><br>production process:<br>2 g of chalcopyrite + 2 g of sodium carbonate / 0†1800 °F + 1 h at 1800 °F (lemon-yellow more intense than «light lemon-yellow») / irradiated with electrons at 162,431 rad |
| lemon-yellow much more intense and a bit darker than «vivid lemon-yellow» | 3136 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 50 ml nitric acid / soaking: 2 wk. / separation of the liquid and the solid / natural drying (colour of the liquid: vivid lemon-yellow) / irradiated with gamma rays at 70.4 Mrad (followed at «dark beige [orange tone]») |
| dark lemon-yellow | 3137 | mineral : calcite[11]<br>powder : white<br>origin : Calcite du Nord Company, Saint-Eugène de Mistassini, Lac Saint-Jean, Québec<br><br>production process:<br>(followed from «beige [yellow tone]»)<br>4 g of calcite + 25 ml sulphuric acid / soaking: 24 h / drying on hot plate (very light beige): .3 g + 50 cc of transparent polyester resin + 1% of catalyst / manual grinding / moulding / hardening (light beige [light yellow reflection]) / irradiated with electrons at 305,082 rad[354] |
| lemon-yellow (green tone) | | |
| | | mineral : fluorine<br>rock : light pink, translucid<br>powder : white (light pink reflection)<br>origin : Saint-Lawrence Fluorspar Company, Saint-Lawrence, Newfoundland<br><br>production process:<br>(followed from «ivory») |

| | | |
|---|---|---|
| lemon-yellow (light green reflection) more intense than «very, very light lemon-yellow (green reflection)» | 3138 | .2 g of fluorine + 50 cc of transparent polyester resin + 1% of catalyst / manual grinding / moulding / hardening (very, very light greenish yellow) / irradiated with electrons at 305,082 rad[354] |
| lemon-yellow (very light green tone) more intense than «light lemon-yellow (green tone)» | 3129a | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>(followed from «light lemon-yellow [beige tone]»)<br>2 g of molybdenite + 25 ml sulphuric acid / soaking: 3 d. / drying on hot plate (light grey): .3 g + 50 cc of transparent polyester resin + 1% of catalyst / manual grinding / moulding / hardening (light lemon-yellow) / irradiated with electrons at 305,082 rad[354] |
| lemon-yellow (green tone) more intense than «lemon-yellow (green tone)» | 3130a | mineral : fluorine<br>rock : light pink, translucid<br>powder : white (light pink reflection)<br>origin : Saint-Lawrence Fluorspar Company, Saint-Lawrence, Newfoundland<br><br><u>production process:</u><br>(followed from «light beige»)<br>2 g of fluorine + 20 ml hydrochloric acid / soaking: 3 d. / drying on hot plate (white [very light yellow reflection]): .2 g + 50 cc of transparent polyester resin + 1% of catalyst / manual grinding / moulding / hardening (lemon-yellow [light green tone]) / irradiated with electrons at 305,082 rad[354] |
| lemon-yellow (beige tone) | | |
| light lemon-yellow (beige tone) | 3131a | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>2 g of molybdenite + 25 ml sulphuric acid / soaking: 3 d. / drying on hot plate (light grey): .3 g + 50 cc of transparent polyester resin + 1% of |

| | | |
|---|---|---|
| | | catalyst / manual grinding / moulding / hardening (light lemon-yellow) / irradiated with electrons at 155,082 rad (followed at «lemon-yellow [very light green tone] more intense than "light lemon-yellow [green tone]"») |
| yolk-yellow | | |
| yolk-yellow more intense and a bit darker than «light yolk-yellow» | 3132a | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>(followed from «light brownish yellow»)<br>2 g of fluorine + 20 ml hydrochloric acid / soaking: 3 d. / drying on hot plate (light brown): .2 g + 50 cc of transparent polyester resin + 1% of catalyst / manual grinding / moulding / hardening (light lemon-yellow) / irradiated with electrons at 305,082 rad[354] |
| yolk-yellow | 3133a | mineral : pyrrhotite[276]<br>rock : dark greyish brown, with golden yellow metallic brilliance<br>powder : dark grey<br>origin : Inco Co., Sudbury, Ontario<br><br>production process:<br>4 g of pyrrhotite + 20 ml nitric acid / soaking: 3 d. / drying on hot plate[484] |
| yolk-yellow (orange reflection) more vivid and much more intense than «yolk-yellow (orange reflection)» | 3134a | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «greenish yellow more intense than "greenish yellow"»)<br>3 g of wilsonite + 50 ml hydrochloric acid / soaking: 2 wk. / drying on hot plate (yellowish green or greenish yellow) / irradiated with gamma[239] rays at 424.7 Mrad |

| | | |
|---|---|---|
| vivid yolk-yellow | 3135a | mineral : solid epidote<br>rock : brownish green<br>powder : brownish green<br>origin : James Bay, Québec<br><br>production process:<br>12 g of epidote + 40 ml hydrochloric acid / soaking: 14 d. / separation of the liquid and the solid / natural drying / colour of the liquid[485] |
| vivid and luminous yolk-yellow (accentuated orange tone) | 3136a | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «orange»)<br>0↑1900 °F (chamois [orange tone a bit more accentuated than «light orange tone»]): 50 g + 200 ml hydrochloric acid / soaking: 1 wk. / drying on hot plate (vivid sunny yellow [light green tone]) / 1300 °F / 1 h (pronounced orange) / irradiated with gamma rays at 550.22 Mrad |
| vivid yolk-yellow | 3137a | mineral : analcime<br>rock : white (grey reflection), crystalline and translucide<br>powder : light grey<br>origin : De-Mix quarry, North side of Mont Saint-Hilaire, Rouville county, Québec<br><br>production process:<br>1 g of analcime + 50 ml hydrochloric acid / soaking: 2 wk. / drying on hot plate (light and vivid lemon-yellow) / irradiated with gamma rays at 64.7 Mrad[486]<br>(followed at «medium orange») |
| vivid yolk-yellow | 3138a | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>(followed from «yellowish green»)<br>0↑1900 °F (dark iron-grey): 1 g + 50 ml sulphuric acid / soaking: 2 wk. / drying on hot plate (beige [with a few grey particles]) / irradiated with electrons at 302,831 rad[45] |

| | | |
|---|---|---|
| vivid yolk-yellow | 3139 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml hydrochloric acid / natural drying (very vivid yellow [orange tone]) / irradiated with gamma rays at 63.88 Mrad (followed at «creamy yellow») |
| yolk-yellow more strong and dark than «vivid yolk-yellow» | 3140 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «yellow [light orange tone]»)<br>50 g of asbestos + 200 ml hydrochloric acid or asbestos entirely covered with hydrochloric acid / soaking: 1 wk. / drying on hot plate (vivid yellow) / irradiated with gamma rays at 287.3 Mrad (followed at «daisy-yellow») |
| very vivid yolk-yellow (accentuated orange tone) | 3141 | production process:<br>(followed from «intense pinkish chamois [orange tone]»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]) / 600 °F / 1 h (pinkish chamois) / irradiated with gamma rays at 550.22 Mrad |
| yolk-yellow (green tone) | | |
| yolk-yellow (very light green reflection) | 3142 | mineral : chromite<br>rock : blackish grey<br>powder : medium brownish grey<br>origin : Black Lake, near Thetford Mines, Québec<br><br>mineral : cement[1138]<br>powder : white<br><br>production process:<br>2 g of chromite + 2 g of sodium carbonate / 0↑1900 °F + 2 h at 1900 °F (apple-green darker than «dark apple-green»): 1 g + 13.74 g of cement + |

546

| | | |
|---|---|---|
| | | 6.50 cc of water / manual grinding / moulding / hardening (very light lemon-yellow) / irradiated with gamma rays at 18.85 Mrad |
| daisy-yellow | | |
| daisy-yellow more strong and dark than «vivid daisy-yellow» | 3143 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «yolk-yellow»)<br>50 g of asbestos + 200 ml hydrochloric acid or asbestos entirely covered with hydrochloric acid / soaking: 1 wk. / drying on hot plate (vivid yellow) / irradiated with gamma rays at 360 Mrad<br>(followed at «greenish yellow») |
| sunny yellow [sunflower] | | |
| sunny yellow | 3144 | mineral : uraninite<br>rock : medium chocolate-brown (red Bordeau tone)<br>powder : medium milky chocolate-brown<br>origin : Yellowknife, Canada<br><br>production process:<br>(followed from «light apple-green»)<br>0↑1900 °F (medium brown [orange tone]): 1 g + 80 ml hydrochloric acid / soaking: 2 wk. / drying on hot plate[487] |
| sunny yellow | 3145 | production process:<br>8 g of uraninite + 100 ml hydrochloric acid / soaking: 2 wk. / drying on hot plate<br>(followed at «medium and mat pinkish orange») |
| sunny yellow more dark than «sunny yellow» | 3146 | mineral : peridotite<br>rock : medium grey<br>powder : medium brownish grey (green reflection)<br>origin : Thetford Mines, Québec<br><br>production process:<br>4 g of peridotite + 100 ml hydrochloric acid / soaking: 2 wk. / separation of the liquid and the solid / drying on hot plate (colour of the liquid: light lemon-yellow) / irradiated with gamma rays at 64.7 Mrad<br>(followed at «orange a bit darker than "orange"») |

| | | |
|---|---|---|
| sunny yellow (green tone) | | |
| vivid sunny yellow (light green tone) | 3147 | mineral : asbestos[4]<br>rock : dark grey (green reflection)<br>powder : light grey (green reflection)<br>origin : Asbestos Corporation Ltd., Thetford Mines, Québec<br><br>production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate[488] |
| sunny yellow (orange tone) | | |
| sunny yellow (orange tone) | 3148 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «yellow [orange tone]»)<br>0↑1900 °F (chamois [orange tone a bit more accentuated than «light orange tone»]): 50 g + 200 ml hydrochloric acid or asbestos entirely covererd with hydrochloric acid / soaking: 1 wk. / drying on hot plate (vivid sunny yellow [light green tone]) / 300 °F / 1 h[463,464]<br>(followed at «pinkish chamois») |
| golden yellow | | |
| | | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>light amber sheet heated: |
| amber | 3149 | 0↑1200 °F |
| which | 3149.1 | 0↑1250 °F |
| | 3149.2 | 0↑1300 °F |
| | 3149.3 | 0↑1400 °F |
| | 3149.4 | 0↑1500 °F |
| becomes beige and evolves | 3150 | 0↑1600 °F |

| | | |
|---|---|---|
| ↓ | 3150.1 | 0↑1620 °F |
| | 3150.2 | 0↑1640 °F |
| | 3150.3 | 0↑1660 °F |
| | 3150.4 | 0↑1700 °F |
| | 3151 | 0↑1800 °F |
| light golden | 3151.1 | 0↑1900 °F |
| yellow | 3152 | 0↑2000 °F[119] |
| | 3153 | mineral : gold (grains on a rock)<br>rock : golden yellow, with metallic luster<br>origin : Abitibi, Québec<br><u>production process:</u><br>(followed from «yellow [orange tone]») |
| golden yellow more accentuated than «golden yellow» | 3154 | rock irradiated with gamma rays at 360 Mrad[489] |
| golden yellow (orange tone) | | |
| | | mineral : mica<br>rock : golden brown, with vitreous luster, translucid<br>powder : light amber, with vitreous luster, translucid<br>origin : Lac Vert mountain, region of Low, near Hincks, Québec<br><u>production process:</u><br>light amber sheet heated 0↑2000 °F (light golden yellow, translucid) / irradiated with gamma rays at: |
| golden yellow more golden and darker than «light golden yellow» | 3155 | 64.7 Mrad |
| ↓ | | |
| golden yellow more orange and intense | 3156 | 65.704 Mrad |
| ↓ | | |
| golden yellow still more orange and intense | 3157 | 124.704 Mrad |
| ↓ | | |
| golden yellow still more orange and intense | 3158 | 424.7 Mrad |
| ↓ | | |
| golden yellow (orange tone) more intense and darker | 3159 | 484.704 Mrad |

549

| golden yellow (brown tone) | | |
|---|---|---|
| | | mineral : chalcopyrite<br>rock : brass-yellow, with metallic luster<br>powder : dark grey (with golden particles)<br>origin : Noranda Mines, Noranda, Abitibi, Québec<br><br>production process:<br>rock irradiated with gamma rays at: |
| golden yellow (brown tone)<br>↓ | 3160 | 5 Mrad |
| golden yellow (brown tone more accentuated)<br>↓ | 3161 | 10 Mrad |
| old gold (yellow and iridescent tones)<br>↓ | 3162 | 57.4 Mrad[491] |
| old gold still darker (brown tone more accentuated)<br>↓ | 3163 | 63.984 Mrad |
| old gold (accentuated brown tone)<br>↓ | 3164 | 102.4 Mrad |
| old gold (brown tone still more accentuated) | 3165 | 148.4 Mrad[492]<br><br>(followed at «medium chocolate-brown») |
| golden yellow (grey tone) | | |
| | | mineral : mica<br>rock : golden brown, with vitreous luster, translucid<br>powder : light amber, with vitreous luster, translucid<br>origin : Lac Vert mountain, region of Low, near Hincks, Québec<br><br>production process: |
| golden yellow (light grey tone) a bit darker than «light golden yellow (grey tone)» | 3166 | light amber sheet heated 0↑2000 °F (light golden yellow and translucid) / irradiated with electrons at 302,831 rad[36] |

550

| | | |
|---|---|---|
| straw-yellow | | |
| pale straw-yellow | 3167 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Montréal, Québec<br><br>production process:<br>(followed from «light grey»)<br>2 g of tremolite + 2 g of titanium dioxide + 1 g of sulphur / 0↑1800 °F |
| pale straw-yellow | 3168 | mineral : calcite[11,319]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>1.50 g of calcite + .50 g of chrome / 1900 °F / 1 h (grass-green [blue tone] darker than «grass-green [blue tone]»): .25 g + 20 ml phosphoric acid / soaking: 3 d. / drying on hot plate (still humid) |
| straw-yellow (green tone) | | |
| straw-yellow (green tone) | 3169 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 20 ml nitric acid / soaking: 3 d. / drying on hot plate (light yellow ochre [orange tone and green reflection]) / irradiated with gamma rays at 64.7 Mrad[493]<br><br>(followed at «dark brownish beige») |

551

| yellow ochre | | |
|---|---|---|
| very pale yellow ochre | 3170 | mineral : fluorine<br>rock : colourless<br>powder : colourless<br>origin : unknown<br><br>production process:<br>.3 g of fluorine + 50 cc of transparent polyester resin + 1% of catalyst / manual grinding / moulding / hardening (very, very light grey [light yellow reflection]) / irradiated with gamma rays at 11.4 Mrad |
| yellow ochre more intense than «very, very light yellow ochre» | 3171 | mineral : apatite<br>rock : reddish brown<br>powder : light pinkish beige<br>origin : Calumet, Pontiac county, Québec<br><br>production process:<br>3 g of apatite + 25 ml nitric acid / soaking: 3 d. / drying on hot plate (light beige): .2 g + 50 cc of transparent polyester resin + 1% of catalyst / manual grinding / moulding / hardening (very, very light yellowish grey) / irradiated with gamma rays at 5.7 Mrad |
| very light yellow ochre | 3172 | mineral : fluorescent calcite<br>rock : white (localized grey or brown reflection), translucid<br>powder : white (yellow reflection)<br>origin : Bancroft, Ontario<br><br>production process:<br>rock hermetically wrapped in bread dough / irradiated with gamma rays at 5.7 Mrad |
| very light yellow ochre | 3173 | mineral : calcite<br>rock : light pink<br>powder : pinkish white<br>origin : Huddersfield district, Pontiac county, Québec<br><br>production process:<br>4 g of calcite + 20 ml hydrochloric acid / soaking: 3 d. / drying on hot plate (vivid yellow [light orange tone]): .3 g + 50 cc of transparent polyester resin + 1% of catalyst / manual grinding / moulding / hardening (very, very light yellowish grey) / irradiated with gamma rays at 5.7 Mrad |

552

| | | |
|---|---|---|
| very light yellow ochre | 3174 | mineral : calcite (with clayey inclusions)<br>rock : very light creamy yellow, translucid<br>powder : white<br>origin : De-Mix quarry, near Saint-Philippe de Laprairie, Québec<br><br>production process:<br>0†500 °F (white semi-opaque) / rock irradiated with gamma rays at 64.7 Mrad (followed at «medium yellow ochre») |
| yellow ochre a bit more intense than «very light yellow ochre» | 3175 | mineral : apatite<br>rock : reddish brown<br>powder : light pinkish beige<br>origin : Calumet, Pontiac county, Québec<br><br>production process:<br>.2 g of apatite + 50 cc of transparent polyester resin + 1% of catalyst / manual grinding / moulding / hardening (very light greyish beige [light yellow reflection]) / irradiated with gamma rays at 5.7 Mrad |
| fairly intense yellow ochre and a bit darker than «very light yellow ochre» | 3176 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml nitric acid / soaking: 3 d. / drying on hot plate (dark milky chocolate-brown): .2 g + 50 cc of transparent polyester resin + 1% of catalyst / manual grinding / moulding / hardening (very light grey [light yellow reflection]) / irradiated with gamma rays at 5.7 Mrad |
| yellow ochre a bit lighter than «light yellow ochre» | 3177 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 20 ml nitric acid / soaking: 3 d. / drying on hot plate (light yellow ochre [orange tone and green reflection]) / irradiated with electrons at 302,831 rad[34] |
| | | mineral : fluorine<br>rock : light pink, translucid |

553

| | | |
|---|---|---|
| | | powder : white (light pink reflection)<br>origin : Saint-Lawrence Fluorspar Company, Saint-Lawrence, Newfoundland |
| yellow ochre a bit less intense than «light yellow ochre» | 3178 | production process:<br>2 g of fluorine + 20 ml sulphuric acid / soaking: 3 d. / drying on hot plate (very light beige): .2 g + 50 cc of transparent polyester resin + 1% of catalyst / manual grinding / moulding / hardening (light lemon-yellow) / irradiated with gamma rays at 5.7 Mrad |
| | | mineral : asbestos[4]<br>rock : dark grey (green reflection)<br>powder : light grey (green reflection)<br>origin : Asbestos Corporation Ltd., Thetford Mines, Québec |
| light yellow ochre | 3179 | production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]) / 600 °F / 1 h (intense pinkish chamois) / irradiated with electrons at 162,431 rad |
| | | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec |
| light yellow ochre | 3180 | production process:<br>3 g of apatite + 20 ml sulphuric acid / soaking: 3 d. / drying on hot plate (light beige): .3 g + 50 cc of transparent polyester resin + 1% of catalyst / manual grinding / moulding / hardening (light beige [light yellow reflection]) / irradiated with gamma rays at 11.4 Mrad |
| | | mineral : calcite<br>rock : light pink<br>powder : pinkish white<br>origin : Huddersfield district, Pontiac county, Québec |

| | | |
|---|---|---|
| light yellow ochre | 3181 | production process: 4 g of calcite + 20 ml nitric acid / soaking: 3 d. / drying on hot plate (orange): .3 g + 50 cc of transparent polyester resin + 1% of catalyst / manual grinding / moulding / hardening (light beige [light yellow reflection]) / irradiated with gamma rays at 5.7 Mrad |
| light yellow ochre | 3182 | mineral : gypsum<br>rock : white (yellow reflection)<br>powder : white (yellow reflection)<br>origin : Geisborough, Nova Scotia<br><br>production process: 2 g of gypsum + 20 ml hydrochloric acid / soaking: 3 d. / drying on hot plate (chalk-white [light yellow reflection]): .3 g + 50 cc of transparent polyester resin + 1% of catalyst / manual grinding / moulding / hardening (very, very light yellow) / irradiated with gamma rays at 5.7 Mrad |
| light yellow ochre | 3183 | mineral : orthoclase<br>rock : white (grey reflection)<br>powder : white (grey reflection)<br>origin : mine near Buckingham, Papineau county, Québec<br><br>production process: 2 g of orthoclase + 20 ml nitric acid / soaking: 3 d. / drying on hot plate (white [light yellow reflection]): .3 g + 50 cc of transparent polyester resin + 1% of catalyst / manual grinding / moulding / hardening (pale yellow) / irradiated with gamma rays at 5.7 Mrad |
| light yellow ochre | 3184 | mineral : steatite<br>rock : light cold grey, slightly translucid<br>powder : light grey<br>origin : East Broughton, Québec<br><br>production process: 30 g of steatite + 50 ml nitric acid / soaking: 1 wk. / drying on hot plate (beige [very light orange tone]): .3 g + 50 cc of transparent polyester resin + 1% of catalyst / manual grinding / moulding / hardening (very, very light grey) / irradiated with gamma rays at 11.4 Mrad |

| | | |
|---|---|---|
| | | mineral : calcite[11]<br>powder : white<br>origin : Calcite du Nord Company, Saint-Eugène de Mistassini, Lac Saint-Jean, Québec<br><br>mineral : galena<br>rock : dark grey, with metallic brilliance<br>powder : dark grey, with metallic brilliance<br>origin : Trail, British Columbia<br><br>production process: |
| light yellow ochre | 3185 | 1 g of calcite + 1 g of galena / 1300 °F / 1 h |
| | | mineral : microcline<br>rock : white (grey reflection)<br>powder : white (grey reflection)<br>origin : Buckingham, Québec<br><br>production process:<br>(followed from «white [yellow reflection]»)<br>granules irradiated with gamma rays at: |
| light yellow ochre ↓ | 3186 | 244.53 Mrad |
| yellow ochre a bit more yellow ↓ | 3187 | 247.6 Mrad |
| yellow ochre equivalent to the previous one | 3188 | 287.3 Mrad<br><br>(followed at «yellow [orange tone]») |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process: |
| light and vivid yellow ochre | 3188.1 | .2 g of fluorine + 50 cc of transparent polyester resin + 1% of catalyst / manual grinding / moulding / hardening (light grey [light yellow reflection]) / irradiated with gamma rays at 5.7 Mrad (followed at «light orange [light beige tone]) |
| | | mineral : fluorine<br>rock : violet and white, translucid<br>powder : very light grey<br>origin : Saint-Lawrence Fluorspar Company, Saint-Lawrence, Newfoundland |

| | | |
|---|---|---|
| light and vivid yellow ochre | 3189 | <u>production process:</u><br>2 g of fluorine + 20 ml nitric acid / soaking: 3 d. / drying on hot plate (orange): .2 g + 50 cc of transparent polyester resin + 1% of catalyst / manual grinding / moulding / hardening (very light grey [light yellow reflection]) / irradiated with gamma rays at 5.7 Mrad |
| light and vivid yellow ochre | 3190 | <u>production process:</u><br>.2 g of fluorine + 50 cc of transparent polyester resin + 1% of catalyst / manual grinding / moulding / hardening (very, very light greenish yellow) / irradiated with gamma rays at 5.7 Mrad |
| light and vivid yellow ochre | 3191 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>.2 g of fluorine + 50 cc of transparent polyester resin + 1% of catalyst / manual grinding / moulding / hardening (very, very light greenish yellow) / irradiated with gamma rays at 5.7 Mrad |
| fairly accentuated yellow ochre | 3192 | mineral : apatite<br>rock : medium brownish red<br>powder : light pinkish beige<br>origin : Ile Calumet, Pontiac county, Québec<br><br><u>production process:</u><br>3 g of apatite + 25 ml sulphuric acid / soaking: 3 d. / drying on hot plate (greyish beige): .3 g + 50 cc of transparent polyester resin + 1% of catalyst / manual grinding / moulding / hardening (light lemon-yellow) / irradiated with gamma rays at 11.4 Mrad |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>(followed from «beige [accentuated orange tone]») |

| | | |
|---|---|---|
| yellow ochre<br>↓<br>lighter yellow ochre | 3193 | 0↑1000 °F (grey [accentuated beige tone]): 5 g + 10 ml nitric acid + 15 ml hydrochloric acid / soaking: 3 d. / drying on hot plate |
| | 3194 | 0↑1000 °F (grey [accentuated beige tone]): 5 g + 5 ml nitric acid + 20 ml hydrochloric acid / soaking: 3 d. / drying on hot plate (followed at «yellow more accentuated than "yellow"») |
| yellow ochre | 3195 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>3 g of apatite + 20 ml nitric acid / soaking: 3 d. / drying on hot plate (light yellow): .3 g + 50 cc of transparent polyester resin + 1% of catalyst / manual grinding / moulding / hardening (very light lemon-yellow) / irradiated with gamma rays at 5.7 Mrad |
| yellow ochre | 3196 | mineral : fluorescent calcite<br>rock : white (localized grey or brown reflection), translucid<br>powder : white (yellow reflection)<br>origin : Bancroft, Ontario<br><br>production process:<br>.25 g of calcite + 2 g of sodium carbonate / 0↑1700 °F + 1 h at 1700 °F[494] |
| yellow ochre | 3197 | mineral : halite[41]<br>rock : colourless<br>powder : colourless<br>origin : Seleine Mine, Iles-de-la-Madeleine, Québec<br><br>production process:<br>.3 g of halite + 50 cc of transparent polyester resin + 1% of catalyst / manual grinding / moulding / hardening (very, very light greenish yellow) / irradiated with gamma rays at 5.7 Mrad |
| yellow ochre | 3198 | production process:<br>rock irradiated with electrons at 162,431 rad |

| | | |
|---|---|---|
| | | (light bluish grey), then at 164,800 rad (light lemon yellow) and at 155,082 rad |
| yellow ochre | 3199 | mineral : olivine<br>rock : light grey, crystalline<br>powder : very light grey<br>origin : Mont Albert, Gaspésie, Québec<br><br>production process:<br>4 g of olivine + 50 ml sulphuric acid / soaking: 2 wk. / drying on hot plate (white [very light beige reflection]) / irradiated with electrons at 162,431 rad |
| yellow ochre | 3200 | mineral : serpentine<br>rock : yellowish green<br>powder : light greenish yellow<br>origin : probably Thetford Mines, Eastern Townships, Québec<br><br>production process:<br>3 g of serpentine + 25 ml sulphuric acid / soaking: 24 h / drying on hot plate (light grey [light brown tone]): .3 g + 50 cc of transparent polyester resin + 1% of catalyst / manual grinding / moulding / hardening (very light grey [light yellow reflection]) / irradiated with gamma rays at 11.4 Mrad |
| yellow ochre<br>↓<br>darker yellow ochre | 3201<br><br>3202 | mineral : bauxite[92]<br>powder : pinkish beige, mat<br>origin : Alcan Company, French Guyana<br><br>production process:<br>(followed from «salmon»)<br>2 g of bauxite + 2 g of sodium carbonate:<br>0↑1300 °F + 1 h at 1300 °F<br><br>0↑1400 °F + 1 h at 1400 °F<br>(followed at «orange [salmon tone]») |
| yellow ochre a bit darker than «yellow ochre» | 3203 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>powder irradiated with electrons at 162,431 rad |

| | | |
|---|---|---|
| yellow ochre a bit more pale than «medium yellow ochre» | 3203.1 | mineral : orpiment<br>rock : vivid yellow (orange tone)<br>powder : vivid yellow (orange tone)<br>origin : Nevada, United States<br><br>mineral : zirconium oxide<br>powder : light beige<br>origin : Tam Ceramic Inc., Montréal, Québec<br><br>animal : dried pork blood<br>powder : dark brown (orange-red tone)<br><br>production process:<br>0.14061 g of orpiment irradiated with gamma rays at 2.26 Mrad + 0.14061 g of dried pork blood irradiated with gamma rays at 2.26 Mrad + 0.14061 g of zirconium oxide / grinding |
| yellow ochre a bit more pale than «medium yellow ochre» | 3203.2 | mineral : orpiment<br>rock : vivid yellow (orange tone)<br>powder : vivid yellow (orange tone)<br>origin : Nevada, United States<br><br>animal : dried pork blood<br>powder : dark brown (orange-red tone)<br><br>production process:<br>0.14061 g of orpiment irradiated with gamma rays at 2.26 Mrad + 0.14061 g of dried pork blood / irradiated with gamma rays at 2.26 Mrad + 0.28122 g of sodium carbonate / grinding |
| medium yellow ochre | 3203.3 | mineral : orpiment<br>rock : vivid yellow (orange tone)<br>powder : vivid yellow (orange tone)<br>origin : Nevada, United States<br><br>animal : dried pork blood<br>powder : dark brown (orange-red tone)<br><br>production process:<br>0.14061 g of orpiment irradiated with gamma rays at 2.26 Mrad + 0.14061 g of dried pork blood / irradiated with gamma rays at 2.26 Mrad / grinding |
| medium yellow ochre | 3204 | mineral : apatite<br>rock : medium brownish red<br>powder : light pinkish beige<br>origin : Ile Calumet, Pontiac county, Québec<br><br>production process:<br>3 g of apatite + 25 ml nitric acid / soaking: 3 d. / drying on hot plate (very light yellow): .3 g + |

| | | |
|---|---|---|
| | | 50 cc of transparent polyester resin + 1% of catalyst / manual grinding / moulding / hardening (light grey [light yellow reflection]) / irradiated with gamma rays at 11.4 Mrad |
| medium yellow ochre | 3204.1 | mineral : tremolite<br>rock : medium brown (evergreen tone)<br>powder : greyish beige<br>origin : Tetreault Mine, Montauban, Portneuf county, Québec<br><br>production process:<br>1 g of tremolite + 5 g of pyrex / manual grinding / heating: 5 °C per min. from 0↑1245 °C + maintenance during 1 h / cooling: 5 °C per min. to ambient temperature / the entity is done in ambient air |
| medium yellow ochre | 3205 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>(followed from «lemon-yellow»)<br>powder irradiated with gamma rays at 604.53 Mrad |
| medium yellow ochre | 3206 | mineral : calcite<br>rock : light pink<br>powder : pinkish white<br>origin : Huddersfield district, Pontiac county, Québec<br><br>production process:<br>.3 g of calcite + 50 cc of transparent polyester resin + 1% of catalyst / manual grinding / moulding / hardening (very, very light grey) / irradiated with gamma rays at 5.7 Mrad |
| medium yellow ochre | 3207 | mineral : calcite[11]<br>powder : white<br>origin : Calcite du Nord Company, Saint-Eugène de Mistassini, Lac Saint-Jean, Québec<br><br>production process:<br>44 g of calcite + 100 ml phosphoric acid / soaking: 3 wk. / drying on hot plate [still humid] (very light grey): .3 g + 50 cc of transparent |

| | | |
|---|---|---|
| | | polyester resin + 1% of catalyst / manual grinding / moulding / hardening (very pale brownish grey) / irradiated with gamma rays at 11.4 Mrad |
| medium yellow ochre | 3208 | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «very light yellow ochre»)<br>0↑500 °F (white semi-opaque) / rock irradiated with gamma rays at 424.7 Mrad |
| medium yellow ochre | 3209 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>0↑1300 °F (yellow more accentuated than «light yellow»): .2 g + 50 cc of transparent polyester resin + 1% of catalyst / manual grinding / moulding / hardening (light grey [very light yellow reflection]) / irradiated with gamma rays at 5.7 Mrad |
| yellow ochre a bit darker than «medium yellow ochre» | 3210 | mineral : fluorescent calcite<br>rock : white (localized grey or brown reflection), translucid<br>powder : white (yellow reflection)<br>origin : Bancroft, Ontario<br><br>production process:<br>4 g of calcite + 20 ml nitric acid / soaking: 3 d. / separation of the liquid and the solid / drying on hot plate (colour of the liquid: light yellow[24]): 1 g + 1 cc of transparent printing ink / manual grinding / 10 superimpositions on glazed white paper (medium yellow ochre [with darker particles]) / irradiated with gamma rays at:<br>11.4 Mrad[89,495] |
| yellow ochre a | 3211 | 17.91 Mrad |

562

| | | |
|---|---|---|
| bit darker than «medium yellow ochre» ↓ yellow ochre a bit darker than «medium yellow ochre» | 3212 | 22.8 Mrad |
| vivid yellow ochre | 3213 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (milky white [pink reflection]): .2 g + 50 cc of transparent polyester resin + 1% of catalyst / manual grinding / moulding / hardening (very, very light greenish grey) / irradiated with gamma rays at 5.7 Mrad |
| vivid yellow ochre | 3214 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (light beige): .2 g + 50 cc of transparent polyester resin + 1% of catalyst / manual grinding / moulding / hardening (very light grey [light yellow reflection]) / irradiated with gamma rays at 11.4 Mrad |
| fairly vivid yellow ochre | 3215 | mineral : apatite<br>rock : medium brownish red<br>powder : light pinkish beige<br>origin : Ile Calumet, Pontiac county, Québec<br><br>production process:<br>3 g of apatite + 25 ml hydrochloric acid / soaking: 3 d. / drying on hot plate (mixture of particles: white / brown): .2 g + 50 cc of transparent polyester resin + 1% of catalyst / manual grinding / moulding / hardening (very light brownish grey [light yellow reflection]) / irradiated with gamma rays at 11.4 Mrad |

| | | |
|---|---|---|
| yellow ochre type a bit more pale than «yellow ochre [between "medium yellow ochre" and "dark yellow ochre"]» | 3215.1 | mineral : orpiment<br>rock : vivid yellow (orange tone)<br>powder : vivid yellow (orange tone)<br>origin : Nevada, United States<br><br>animal : dried pork blood<br>powder : dark brown (orange-red tone)<br><br>production process:<br>1 g of orpiment + 0.28122 g of dried pork blood + 0.14061 g of MgO / grinding |
| yellow ochre type a bit more pale than «yellow ochre [between "medium yellow ochre" and "dark yellow ochre"]» | 3215.2 | production process:<br>1 g of orpiment + 0.28122 g of dried pork blood + 0.28122 g of potassium carbonate / grinding |
| yellow ochre type [between «medium yellow ochre» and «dark yellow ochre»] | 3215.3 | production process:<br>1 g of orpiment + 0.28122 g of dried pork blood / grinding |
| dark yellow ochre | 3216 | mineral : PbO<br>powder : yellow (light orange tone)<br><br>production process:<br>(followed from «yellow [orange tone]»)<br>irradiated with electrons at 305,200 rad[73] |
| dark yellow ochre | 3217 | mineral : spodumene<br>rock : pale green<br>powder : light grey, almost white<br>origin : Québec Lithium Co., Baraute, Abitibi, Québec<br><br>production process:<br>(followed from «lemon-yellow darker than "light lemon-yellow"»)<br>2 g of spodumene + 80 ml hydrochloric acid / soaking: 2 wk. / drying on hot plate (light lemon- |

| | | |
|---|---|---|
| | | yellow) / irradiated with gamma rays at 424.7 Mrad |
| yellow ochre (green tone) | | |
| light yellow ochre (very light green tone) | 3218 | mineral : beryl<br>rock : light blue, slightly translucid<br>powder : light grey<br>origin : Abitibi, Québec<br><br>production process:<br>2 g of beryl + 25 ml hydrochloric acid / soaking: 24 h / drying on hot plate (light yellowish green): .3 g + 50 cc of transparent polyester resin + 1% of catalyst / manual grinding / moulding / hardening (cold and light mint-green) / irradiated with gamma rays at 5.7 Mrad |
| light yellow ochre (light green tone) | 3219 | mineral : gypsum<br>rock : white (yellow reflection)<br>powder : white (yellow reflection)<br>origin : Geisborough, Nova Scotia<br><br>production process:<br>.3 g of gypsum + 50 cc of transparent polyester resin + 1% of catalyst / manual grinding / moulding / hardening (very light grey) / irradiated with gamma rays at 5.7 Mrad |
| greenish yellow ochre more light and acute than «luminous greenish yellow ochre» | 3220 | mineral : andulusite<br>rock : light brownish grey<br>powder : light grey<br>origin : Bimbowrie, South Australia<br><br>production process:<br>(followed from «orange [accentuated olive-green tone]»)<br>4 g of andulusite + 80 ml hydrochloric acid / soaking: 2 wk. / separation of the liquid and the solid / drying on hot plate (colour of the liquid: olive-green more intense than «light olive-green») / irradiated with gamma rays at 430.4 Mrad[239] |
| yellow ochre (light green | 3221 | mineral : chromite<br>rock : blackish grey<br>powder : medium brownish grey<br>origin : Black Lake, near Thetford Mines, Québec<br><br>production process:<br>2 g of chromite + 2 g of sodium carbonate / 0↑1700 °F + 1 h at 1700 °F (intense yellowish |

| | | |
|---|---|---|
| tone) | | green) / irradiated with electrons at 162,431 rad (followed at «mixture of particles: vivid yellow [very light green tone] / medium brown [orange tone]») |
| medium yellow ochre (light green tone) | 3222 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>powder irradiated with neutrons during 2,000 sec. at $10^{12}$ neutrons / $cm^2$ / sec. (fairly vivid light greyish beige) / removed from the source of irradiation / entirely covered with 20 ml of D19 Kodak photographic developer |
| yellow ochre | 3222.1 | mineral : vesuvianite<br>rock : lilac<br>powder : lilac<br>origin : John Manseville Mine, Asbestos, Québec<br><br>production process:<br>1 g of vesuvianite + 5 g of pyrex / manual grinding / heating: 5 °C per min. from 0↑1245 °C + maintenance during 1 h / cooling: 5 °C per min. to ambient temperature / the entity is done in ambient air |
| medium yellow ochre (very light green tone) | 3223 | mineral : olivine<br>powder : colourless (green reflection)<br>origin : Mount Haven, United States<br><br>production process:<br>(followed from «orange»)<br>.3 g of olivine + 50 cc of transparent polyester resin + 1% of catalyst / manual grinding / moulding / hardening (light grey) / irradiation with gamma rays at 11.4 Mrad |
| medium greenish yellow ochre | 3224 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 mo. / natural drying (colour of the liquid: intense green[299]): .3 g + 50 cc of transparent polyester resin + 1% of catalyst / manual grinding / moulding / hardening (pale cold |

| | | |
|---|---|---|
| | | greenish grey) / irradiated with gamma rays at 11.4 Mrad |
| fairly dark yellow ochre (light localized green reflection) | 3225 | mineral : halite[41]<br>rock : colourless<br>powder : colourless<br>origin : Seleine Mine, Iles-de-la-Madeleine, Québec<br><br>production process:<br>rock irradiated with electrons at 162,431 rad (light bluish grey), then at 164,800 rad (light lemon-yellow), then at 155,082 rad (yellow ochre), then with neutrons during 300 sec. at $10^{12}$ neutrons / $cm^2$ / sec.[496] |
| yellow ochre type (green reflection) a bit more pale than «dark yellow ochre (green reflection)» | 3225.1 | mineral : asbestos[4]<br>rock : dark grey (green reflection)<br>powder : light grey (green reflection)<br>origin : Asbestos Corporation Ltd., Thetford Mines, Québec<br><br>animal : dried pork blood<br>powder : dark brown (orange-red tone)<br><br>production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 1 g + 0.28122 g of dried pork blood + 0.14061 g of MgO / grinding |
| yellow ochre type (green reflection) a bit more pale than «dark yellow ochre (green reflection)» | 3225.2 | production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 1 g + 0.28122 g of dried pork blood + 0.28122 g of sodium carbonate / grinding |
| dark yellow ochre type (green reflection) | 3225.3 | production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 1 g + 0.28122 g of dried pork blood / grinding |

567

| | | |
|---|---|---|
| yellow ochre (orange tone) | | |
| light yellow ochre (orange tone) | 3226 | mineral : apatite<br>rock : reddish brown<br>powder : light pinkish beige<br>origin : Calumet, Pontiac county, Québec<br><br>production process:<br>3 g of apatite + 20 ml hydrochloric acid / soaking: 3 d. / drying on hot plate (light grey): .2 g + 50 cc of transparent polyester resin + 1% of catalyst / manual grinding / moulding / hardening (very light iron-grey [light yellow reflection]) / irradiated with gamma rays at 11.4 Mrad |
| yellow ochre (orange tone) | 3227 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>4 g of silica + 20 ml hydrochloric acid / soaking: 2 wk. / irradiated with gamma rays at 11.4 Mrad / drying on sand bath, completed on hot plate |
| orange-yellow ochre (green tone) | | |
| light yellow ochre (orange tone and green reflection) | 3228 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 200 ml nitric acid / soaking: 3 d. / drying on hot plate |
| yellow ochre (beige tone) | | |
| | | mineral : orthoclase<br>rock : light pinkish beige<br>powder : very light beige<br>origin : mine near Buckingham, Papineau county, Québec |

569

| | | |
|---|---|---|
| very light yellow ochre (light beige tone) | 3229 | <u>production process:</u> 2 g of orthoclase + 20 ml nitric acid / soaking: 3 d. / drying on hot plate (very light chamois): .3 g + 50 cc of transparent polyester resin + 1% of catalyst / manual grinding / moulding / hardening (very, very light grey) / irradiated with gamma rays at 11.4 Mrad |
| | | mineral : orthoclase<br>rock : white (grey reflection)<br>powder : white (grey reflection)<br>origin : mine near Buckingham, Papineau county, Québec |
| yellow ochre (light beige tone), more intense than «very light yellow ochre (beige tone)» | 3230 | <u>production process:</u> 2 g of orthoclase + 20 ml sulphuric acid / soaking: 3 d. / drying on hot plate (mixture of particles: white / brown): .3 g + 50 cc of transparent polyester resin + 1% of catalyst / manual grinding / moulding / hardening (very light grey [light yellow reflection]) / irradiated with gamma rays at 11.4 Mrad |
| | | mineral : calcite[11]<br>powder : white<br>origin : Calcite du Nord Company, Saint-Eugène de Mistassini, Lac Saint-Jean, Québec |
| light yellow ochre (beige tone) or light beige ochre (yellow tone) | 3231 | <u>production process:</u> .3 g of calcite + 50 cc of transparent polyester resin + 1% of catalyst / manual grinding / moulding / hardening (very light grey [light yellow reflection]) / irradiated with gamma rays at 11.4 Mrad |
| | | mineral : hornblende<br>rock : medium evergreen (light grey tone), with vitreous luster<br>powder : medium cold grey (light green tone)<br>origin : Abitibi, Québec |
| yellow ochre (beige tone) or beige ochre (yellow tone) a bit darker than «light yellow ochre (beige tone)» or «light beige ochre (yellow tone)» | 3232 | <u>production process:</u> 3 g of hornblende + 25 ml sulphuric acid / soaking: 24 h / drying on hot plate (light greyish green): .2 g + 50 cc of transparent polyester resin + 1% of catalyst / manual grinding / moulding / hardening (light beige [light yellow reflection]) / irradiated with gamma rays at 11.4 Mrad |
| | | mineral : fluorine |

| | | |
|---|---|---|
| yellow ochre (beige tone) or beige ochre (yellow tone) | 3233 | rock : colourless<br>powder : colourless<br>origin : unknown<br><br>production process:<br>2 g of fluorine + 20 ml hydrofluoric acid / soaking: 24 h / drying in oven at 100 °F (creamy white [grey reflection]): .3 g + 50 cc of transparent polyester resin + 1% of catalyst / manual grinding / moulding / hardening (very light grey) / irradiated with gamma rays at 11.4 Mrad |
| yellow ochre (beige tone) or beige ochre (yellow tone) | 3234 | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml sulphuric acid / soaking: 3 d. / drying on hot plate (very light brownish grey): .3 g + 50 cc of transparent polyester resin + 1% of catalyst / manual grinding / moulding / hardening (pale yellow) / irradiated with gamma rays at 11.4 Mrad |
| yellow ochre (beige tone) or beige ochre (yellow tone) | 3235 | mineral : orthoclase<br>rock : light pinkish beige<br>powder : very light beige<br>origin : mine near Buckingham, Papineau county, Québec<br><br>production process:<br>2 g of orthoclase + 20 ml hydrochloric acid / soaking: 3 d. / drying on hot plate (very, very light pink): .3 g + 50 cc of transparent polyester resin + 1% of catalyst / manual grinding / moulding / hardening (greenish grey) / irradiated with gamma rays at 5.7 Mrad |
| yellow ochre (beige tone) or beige ochre (yellow tone) | 3236 | mineral : steatite<br>rock : light evergreen<br>powder : white<br>origin : East Broughton, Québec<br><br>production process:<br>2 g of steatite + 20 ml hydrofluoric acid / soaking: 24 h / drying in oven at 100 °F (white): .3 g + 50 cc of transparent polyester resin + 1% of catalyst / manual grinding / moulding / hardening (light grey [light brown tone]) / irradiated with |

| | | |
|---|---|---|
| | | gamma rays at 11.4 Mrad |
| yellow ochre (beige tone) or beige ochre (yellow tone) | 3237 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>powder finely grinded and heated 0↑1100 °F (Naples yellow [green tone]): .50 g + 15 ml nitric acid / soaking: 2 d. / slow drying on hot plate (light blue): .2 g + 50 cc of transparent polyester resin + 1% of catalyst / manual grinding / moulding / hardening (pale greyish green) / irradiated with gamma rays at 11.4 Mrad |
| yellow ochre (beige tone) or beige ochre (yellow tone) | 3238 | mineral : sphalerite[31]<br>rock : honey-yellow<br>powder : pale honey-yellow<br>origin : Federal Mine, Lemieux district, Gaspésie, Québec<br><br><u>production process:</u><br>80 g of sphalerite + 100 ml nitric acid / soaking: 5 mo. / natural drying (very light cream, almost white): .3 g + 50 cc of transparent polyester resin + 1% of catalyst / manual grinding / moulding / hardening (very light cold grey, partially milky) / irradiated with gamma rays at 11.4 Mrad |
| yellow ochre (beige tone and green reflection) | | |
| yellow ochre (beige tone and light green reflection) or beige ochre (yellow tone and light green reflection) | 3239 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>2 g of molybdenite + 25 ml sulphuric acid / soaking: 3 d. / drying on hot plate (light grey): .3 g + 50 cc of transparent polyester resin + 1% of catalyst / manual grinding / moulding / hardening (light lemon-yellow) / irradiated with gamma rays at 5.7 Mrad |
| yellow ochre (brown tone) | | |

571

| | | |
|---|---|---|
| | | mineral : ochre[98]<br>powder : yellow<br>origin : small copper and nickel deposit, in the South-Western area of a mass of serpentinite at 3 km at the West of Saint-Fabien-de-Panet, Québec |
| | | production process: |
| yellow ochre (light brown tone) | 3240 | 0↑500 °F |
| ↓ | | |
| yellow ochre (brown tone more accentuated) | 3241 | 0↑600 °F<br><br>(followed at «light brown») |
| | | production process:<br>irradiated with gamma rays at: |
| yellow ochre very slightly darker than «yellow ochre» | 3242 | 5 Mrad |
| | 3243 | 5.7 Mrad |
| ¦ | 3244 | 10 Mrad |
| ¦ | 3245 | 57.4 Mrad |
| darkens | 3246 | 64.7 Mrad |
| ¦ | 3247 | 102.4 Mrad |
| ¦ | 3248 | 148.4 Mrad |
| and becomes | 3249 | 201.6 Mrad |
| ¦ | 3250 | 247.6 Mrad |
| ¦ | 3251 | 287.3 Mrad |
| ↓ | 3252 | 360 Mrad |
| darker yellow ochre (brown tone) | 3253 | 424.7 Mrad |
| yellow ochre (greenish brown tone) | | |
| | | mineral : sulphur<br>rock : brilliant yellow<br>powder : brilliant yellow<br>origin : unknown<br><br>mineral : zirconium oxide<br>powder : light beige<br>origin : Tam Ceramic Inc., Montréal, Québec<br><br>production process:<br>(followed from «light lemon-yellow») |
| pale yellow ochre (brown tone and green reflection) | 3254 | .50 g of sulphur + .50 g of zirconium oxide[497] (light creamy yellow) / irradiated with gamma rays at 424.7 Mrad |
| honey-yellow | | |

| | | |
|---|---|---|
| light honey-yellow tone | 3255 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>rock irradiated with electrons at 155,082 rad (light smoky grey tone), then with gamma rays at 360 Mrad[498] |
| light honey-yellow | 3256 | mineral : dolomite<br>rock : light grey<br>powder : light grey<br>origin : Shefferville, Ungava, Québec<br><br>production process:<br>(followed from «yellow [light green tone]»)<br>2 g of dolomite + 2 g of sodium carbonate / 0↑1900 °F + 1 h at 1900 °F (olive-green lighter than «olive-green») / irradiated with electrons at 302,831 rad[45] |
| honey-yellow (localized pink reflections) | 3256.1 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>1 g of galena + 1 g of sulphur + 5 g of pyrex / manual grinding / heating: 5 °C per min. 0↑1245 °C + maintenance during 1 h / cooling: 5 °C per min. to ambient temperature / the entity is done in ambient air |
| | 3257 | mineral : honey grossular garnet<br>rock : light pinkish beige<br>powder : very light beige<br>origin : Jeffrey Mine, Asbestos (presently J.-M. Asbestos), Québec |
| honey-yellow more yellow and accentuated than «honey-yellow» | 3258 | production process:<br>rock heated at 1500 °F / 1 h |
| | | mineral : mica |

573

| | | |
|---|---|---|
| medium honey-yellow | 3258.1 | rock : golden brown, with vitreous luster, translucid<br>powder : light amber, with vitreous luster, translucid<br>origin : Lac Vert mountain, region of Low, near Hincks, Québec<br><br>production process:<br>1 g of mica + 6.50 g of glass powder (spruce pine batch) / manual grinding / deposited on a ceramic plate at the state of a biscuit / heating in a furnace 0↑1000 °C in ambient air / slow cooling in furnace[1272] |
| medium honey-yellow | 3259 | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «white [yellow reflection]»)<br>rock hermetically wrapped in bread dough / 1600 °F / 1 h (white [slightly translucid]) / irradiated with gamma rays at 424.7 Mrad |
| honey-yellow | 3260 | mineral : stilbite<br>rock : white (honey-yellow reflection)<br>powder : white (honey-yellow reflection)<br>origin : Lac d'amiante Mine, Black Lake, Québec<br><br>production process:<br>rock[228] irradiated with gamma rays at:<br>64.7 Mrad[499] |
| honey-yellow a bit more intense | 3261 | 102.4 Mrad[500] |

| | | |
|---|---|---|
| honey-yellow a bit darker | 3262 | 148.7 Mrad[501] |
| honey-yellow still slightly darker | 3263 | 201.6 Mrad |
| equivalent honey-yellow | 3264 | 247.6 Mrad |
| honey-yellow much more accentuated | 3265 | 287.3 Mrad[502] |
| honey-yellow still much more accentuated | 3266 | 360 Mrad |
| dark honey-yellow | 3267 | 424.7 Mrad |
| mixture of particles | | |
| 2 areas: light honey-yellow (grey tone) / light grey | 3268 | mineral : quartz (with impurities of white kaolinite)<br>rock : opaline white, slightly translucid<br>origin : quarry near St.-Rémi d'Amherst, Québec<br><br>production process:<br>(followed from «white [yellow reflection]»)<br>1500 °F / 1 h (white [more white and a bit more opaque than «opaline white»]) / rock irradiated with gamma rays at 424.7 Mrad |
| honey-yellow (orange tone) / dark brown | 3269 | mineral : sardonyx<br>rock : white, slightly translucid (with a light orange-amber circular area on the surface)<br>powder : very light grey<br>origin : unknown<br><br>production process:<br>(followed from «light beige»)<br>4 g of sardonyx + 40 ml hydrochloric acid / soaking: 14 d. / separation of the liquid and the solid / natural drying (colour of the solid: pale apple-green) / irradiated with gamma rays at 424.7 Mrad |
| | | production process:<br>(followed from «emerald-green more pale than |

| | | |
|---|---|---|
| honey-yellow (orange tone) / medium chocolate-brown | 3270 | "medium emerald-green"») 4 g of sardonyx + 40 ml nitric acid / soaking: 1 wk. / separation of the liquid and the solid / natural drying (colour of the liquid: medium emerald-green[24]) / irradiated with gamma rays at 424.7 Mrad |
| honey-yellow (orange tone) / dark chocolate-brown | 3271 | production process: (followed from «pale apple-green») 4 g of sardonyx + 40 ml hydrochloric acid / soaking: 14 d. / separation of the liquid and the solid / natural drying (colour of the liquid: light and vivid apple-green) / irradiated with gamma rays at 424.7 Mrad |
| yellow (beige tone) | | |
| pale yellow (beige tone) | 3272 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>rock entirely covered with 20 ml hydrochloric acid / soaking: 2 wk. / irradiated with gamma rays at 11.4 Mrad / drying on sand bath, completed on hot plate |
| | | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «creamy yellow [light beige tone]»)<br>rock irradiated with gamma rays at: |
| yellow (light beige tone) ↓ | 3273 | 102.4 Mrad |
| yellow (more accentuated beige tone) | 3274 | 148.4 Mrad<br>(followed at «yellow [orange tone fairly pronounced]») |
| | | mineral : halite[41]<br>rock : colourless<br>powder : colourless<br>origin : Seleine Mine, Iles-de-la-Madeleine, Québec |

| | | |
|---|---|---|
| yellow (beige tone) or beige (yellow tone) | 3275 | production process:<br>powder irradiated with electrons at 162,431 rad |
| yellow (beige tone) | 3276 | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>2 g of mica + 2 g of sodium carbonate / 1300 °F / 1 h[133] |
| yellow (beige tone) | 3277 | mineral : steatite<br>rock : light cold grey, slightly translucid<br>powder : light grey<br>origin : East Broughton, Québec<br><br>production process:<br>(followed from «beige darker than "very light beige"»)<br>20 g of steatite + 100 ml nitric acid / soaking: 5 mo. / natural drying (light orange): .3 g + 50 cc of transparent polyester resin + 1% of catalyst / manual grinding / moulding / hardening (very light beige [light yellow tone]) / irradiated with electrons at 305,082 rad[354] |
| medium and vivid yellow (beige tone) | 3278 | mineral : vesuvianite<br>rock : lilac<br>powder : lilac<br>origin : John Mansville Mine, Asbestos, Québec<br><br>production process:<br>12 g of vesuvianite + 40 ml hydrochloric acid / soaking: 1 wk. / drying on sand bath |
| dark yellow (beige tone) | 3279 | mineral : andulusite<br>rock : light brownish grey<br>powder : light grey<br>origin : Bimbowrie, South Australia<br><br>production process:<br>(followed from «apple-green [brown tone]»)<br>2 g of andulusite + 2 g of sodium carbonate / 0↑1500 °F + 15 min. at 1500 °F (light apple-green) / irradiated with gamma rays at 424.7 Mrad |

577

| | | |
|---|---|---|
| yellow (beige tone and pink reflection) | | |
| dark yellow (beige tone and pink reflection) | 3280 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>(followed from «yellow [brown or grey tone]»)<br>rock irradiated with electrons at 305,200 rad[73] |
| bronze-yellow | | |
| light bronze-yellow | 3280.1 | mineral : tellurium<br>powder : dark metallic grey<br>origin : Minéraux Noranda Inc., lot 64, Montréal, Québec<br><br><u>production process:</u><br>the round end of a pyrex test tube is heated to the point of fusion with an oxyacetylene welding torch / then, 5 g of tellurium is sprinkled on the melted surface / the entity is immediately brought back to the state of fusion with the torch / the cooling in ambient air is immediate (greyish cream) / irradiation with gamma rays at 9.88 Mrad |
| yellow (brown tone) | | |
| yellow (brown or grey tone), darker than «very light yellow (brown or grey tone)» | 3281 | mineral : calcite (with clayey inclusions)<br>rock : very light creamy yellow, translucid<br>powder : white<br>origin : De-Mix quarry, near Saint-Philippe de Laprairis, Québec<br><br><u>production process:</u><br>rock irradiated with electrons at 164,800 rad<br><br>(followed at «dark yellow [beige tone and pink reflection]») |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland |

| | | |
|---|---|---|
| light yellow (brown tone) | 3282 | production process:<br>2 g of fluorine + 20 ml hydrochloric acid / soaking: 3 d. / drying on hot plate (light brown): .2 g + 50 cc of transparent polyester resin + 1% of catalyst / manual grinding / moulding / hardening (light lemon-yellow) / irradiated with electrons at 155,082 rad<br>(followed at «yolk-yellow») |
| | | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «yellow [orange tone]»)<br>rock irradiated with gamma rays at: |
| yellow (light brown tone)<br>↓ | 3283 | 247.6 Mrad |
| yellow (brown tone a bit more accentuated) | 3284 | 287.3 Mrad<br><br>(followed at «light brown») |
| | | mineral : asbestos⁴<br>rock : dark grey (green reflection)<br>powder : light grey (green reflection)<br>origin : Asbestos Corporation Ltd., Thetford Mines, Québec<br><br>production process:<br>(followed from «intense yellow [light green tone]») |
| brownish yellow a bit darker [brown] and mat than «vivid brownish yellow» | 3285 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]) / irradiated with gamma rays at 550.22 Mrad |
| | | mineral : fluorine<br>rock : very pale yellow, translucid<br>powder : white (light yellow reflection)<br>origin : Ohio, United States<br><br>production process: |
| dark yellow (brown tone) | 3286 | rock irradiated with electrons at 140,440 rad<br>(followed at «peacock-blue») |

| | | |
|---|---|---|
| | 3287 | mineral : orpiment<br>rock : vivid yellow (orange tone)<br>powder : vivid yellow (orange tone)<br>origin : Nevada, United States |
| dark yellow (localized brown reflection) | 3288 | production process:<br>rock irradiated with gamma rays at 484.70 Mrad[228,303] |
| brownish yellow (green tone) | | |
| | 3289 | mineral : serandite<br>rock : orange-pink or salmon (with more orange areas)<br>powder : pinkish white<br>origin : De-Mix quarry, North side of Mont Saint-Hilaire, Rouville county, Québec |
| brownish yellow (green reflection) more intense and darker than «brownish yellow (green tone)» | 3290 | production process:<br>(followed from «light brown»)<br>2 g of serandite + 20 ml hydrochloric acid / soaking: 3 d. / drying on hot plate (beige [orange tone]): .3 g + 50 cc of transparent polyester resin + 1% of catalyst / manual grinding / moulding / hardening (grey [brown and yellow tones]) / irradiated with electrons at 305,082 rad[354] |
| yellow (grey tone) | | |
| | | mineral : fluorescent calcite<br>rock : white (localized grey or brown reflection), translucid<br>powder : white (yellow reflection)<br>origin : Bancroft, Ontario |
| pale greyish yellow | 3291 | production process:<br>(followed from «light beige»)<br>4 g of calcite + 20 ml sulphuric acid / soaking: 3 d. / drying on hot plate (white [light beige reflection]): .3 g + 50 cc of transparent polyester resin + 1% of catalyst / manual grinding / moulding / hardening (light grey [yellow reflection]) / irradiated with electrons at 305,082 rad[354] |
| | | mineral : fluorine<br>rock : very light yellow, translucid<br>powder : white (light yellow reflection)<br>origin : Saint-Lawrence Fluorspar Company, Saint-Lawrence, Newfoundland |

| | | |
|---|---|---|
| yellow (grey or brown tone) darker and more accentuated than «very light yellow (grey or brown tone)» | 3292 | production process:<br>(followed from «light beige»)<br>2 g of fluorine + 20 ml nitric acid / soaking: 3 d. / drying on hot plate (light orange [beige tone]): .2 g + 50 cc of transparent polyester resin + 1% of catalyst / manual grinding / moulding / hardening (very light grey [light yellow reflection]) / irradiated with electrons at 305,082 rad[354] |
| dark greyish yellow | 3293 | mineral : apatite<br>rock : reddish brown<br>powder : light pinkish beige<br>origin : Calumet, Pontiac county, Québec<br><br>production process:<br>(followed from «light beige»)<br>3 g of apatite + 20 ml hydrochloric acid / soaking: 3 d. / drying on hot plate (light grey): .2 g + 50 cc of transparent polyester resin + 1% of catalyst / manual grinding / moulding / hardening (very light iron-grey [light yellow reflection]) / irradiated with electrons at 305,082 rad[354] |

YELLOW (ORANGE TONE)

| colour obtained | number | mineral / production process |
|---|---|---|
| pale yellow (orange tone) | 3294 | mineral : zincite<br>rock : mixture of areas: dark grey / orange-red<br>powder : medium milky chocolate-brown (red tone)<br>origin : Franklin, New-Jersey, United States<br><br><u>production process:</u><br>(followed from «dark chocolate-brown»)<br>2 g of zincite + 2 g of sodium carbonate / 0↑1400 °F + 1 h at 1400 °F<br>(followed at «very dark and intense emerald-green [blue tone]») |
| very light yellow (orange tone) | 3295 | mineral : gypsum<br>rock : white (yellow reflection)<br>powder : white (yellow reflection)<br>origin : Seisborough, Nova Scotia<br><br><u>production process:</u><br>1000 °C / 1 h (white [light yellow reflection]) / rock irradiated with gamma rays at 482.984 Mrad[505] |
| yellow (orange tone) more intense than «very light yellow (orange tone)» | 3296 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>12 g of serandite + 40 ml nitric acid / natural drying (very light creamy yellow) / irradiated with gamma rays at 64.7 Mrad<br>(followed at «pale beige») |
| | | mineral : apophyllite<br>rock : milky white, translucid<br>powder : white<br>origin : Gaspé Copper Mine, Gaspé, Québec |

| | | |
|---|---|---|
| yellow (orange tone) a bit more orange and pale than «light yellow (orange tone)» | 3297 | production process:<br>1 g of apophyllite + 60 ml hydrochloric acid / soaking: 2 wk. / drying on hot plate (light yellow [orange tone]) / irradiated with gamma rays at 64.7 Mrad<br>(followed at «dark greyish beige [light orange tone]») |
| light yellow (orange tone) | 3298 | mineral : tiger-eye agate<br>rock : orange with silky luster, opaque<br>powder : orange with silky luster<br>origin : Africa<br><br>production process:<br>3 g of agate + 40 ml sulphuric acid / soaking: 18 d. / drying on hot plate (light grey) / irradiated with electrons at 164,800 rad<br>(followed at «mixture of particles: vivid yellow / orange / brownish grey») |
| light yellow (orange tone) | 3299 | mineral : apophyllite<br>rock : milky white, translucid<br>powder : white<br>origin : Gaspé Copper Mine, Gaspé, Québec<br><br>production process:<br>1 g of apophyllite + 60 ml hydrochloric acid / soaking: 2 wk. / drying on hot plate |
| light yellow (orange tone) | 3299.1 | mineral : bauxite[92]<br>powder : pinkish beige, mat<br>origin : Alcan Company, French Guyana<br><br>production process:<br>20 g of bauxite + 20 g of caustic soda / 0↑1100 °C (apple-green [light cream reflection], more accentuated than «pale apple-green [creamy beige tone]») / irradiated with gamma rays at 2.26 Mrad |
| light yellow (orange tone) | 3300 | mineral : fluorescent calcite<br>rock : white (grey or brown localized reflection), translucid<br>powder : white (yellow reflection)<br>origin : Bancroft, Ontario<br><br>production process:<br>(followed from «light creamy yellow»)<br>rock irradiated with gamma rays at:<br>57.4 Mrad |

| | | |
|---|---|---|
| yellow (orange tone) a bit more accentuated and dark | 3301 | 64.7 Mrad |
| yellow (orange tone) still more accentuated and dark | 3302 | 65.704 Mrad |
| yellow (orange tone) darker and more accentuated | 3303 | 102.4 Mrad<br>(followed at «orange-yellow [light brown tone]») |
| light yellow (orange tone) | 3304 | mineral : dolomite<br>rock : white (localized yellow reflection), crystalline and translucid<br>powder : white<br>origin : Bristol district, Pontiac county, Québec<br><br>production process:<br>(followed from «white [blue or grey reflection]»)<br>powder irradiated with gamma rays at 424.7 Mrad |
| light yellow (orange tone) | 3305 | mineral : solid epidote<br>rock : brownish green<br>powder : brownish green<br>origin : James Bay, Québec<br>production process:<br>12 g of epidote + 40 ml hydrochloric acid / soaking: 14 d. / separation of the liquid and the solid / natural drying (colour of the liquid: vivid yolk-yellow) / irradiated with electrons at 164,800 rad<br>(followed at «orange [brown tone]») |
| light yellow (orange tone) | 3306 | mineral : pyrophyllite<br>rock : light beige (grey and pink tones), opaque<br>powder : very light beige (grey and orange-pink tones)<br>origin : Carpentier district, Abitibi, Québec<br>production process:<br>1 g of pyrophyllite + 80 ml hydrochloric acid / soaking: 2 wk. / drying on hot plate |
| | | mineral : antigorite<br>rock : pale yellowish green<br>powder : very pale greenish yellow<br>origin : Canadian Refractories Mine, Kilmar, |

| | | |
|---|---|---|
| light yellow (orange tone) | 3307 | Canada<br><br>production process:<br>2 g of antigorite + 20 ml hydrochloric acid / soaking: 3 d. / drying on hot plate |
| yellow (accentuated orange tone) more accentuated than «light yellow (orange tone)» | 3308 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «light yellow»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate[463,464] (vivid sunny yellow [light green tone]) / 200 °F / 1 h<br>(followed at «sunny yellow [orange tone]») |
| light and vivid yellow (light orange tone) | 3309 | mineral : chalcopyrite<br>rock : brass-yellow, with a metallic luster<br>powder : dark grey (with golden particles)<br>origin : Noranda Mines, Noranda, Abitibi, Québec<br><br>production process:<br>2 g of chalcopyrite + 2 g of sodium carbonate / 0↑1800 °F + 1 h at 1800 °F (vivid lemon-yellow) / irradiated with gamma rays at 64.7 Mrad<br>(followed at «greenish yellow more intense and darker than "vivid greenish yellow"») |
| yellow (orange tone) more intense than «light yellow (orange tone)» | 3310 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (light brown): .2 g + 50 cc of transparent polyester resin + 1% of catalyst / manual grinding / moulding / hardening (light lemon-yellow) / irradiated with gamma rays at 5.7 Mrad |
| | | mineral : chalcopyrite |

| | | |
|---|---|---|
| yellow [tends towards orange] | 3311 | rock : brass-yellow, with a metallic luster<br>powder : dark grey (with golden particles)<br>origin : Noranda Mines, Noranda, Abitibi, Québec<br><br>production process:<br>(followed from «apple-green [yellow tone]»)<br>5 g of chalcopyrite + 20 ml nitric acid / soaking: 15 h / separation of the liquid (1st) and the solid / addition to the same solid of 20 ml nitric acid / soaking: 3 d. / separation of the liquid (2nd) and the solid / natural drying / colour of the solid[347] |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «canary-yellow»)<br>50 g of asbestos + 200 ml hydrochloric acid or asbestos entirely covered with hydrochloric acid / soaking: 1 wk. / drying on hot plate (vivid yellow) / irradiated with gamma rays at: |
| yellow (light orange tone)<br>↓ | 3312 | 247.6 Mrad |
| yellow still a bit more orange | 3313 | 254.20 Mrad<br>(followed at «yolk-yellow») |
| | | production process: |
| various yellows with orange tone | 3314 | 3 g of asbestos + 5 ml hydrochloric acid + 20 ml of water / immediate drying on hot plate |
| ↓ | 3315 | 3 g of asbestos + 10 ml hydrochloric acid + 15 ml of water / immediate drying on hot plate |
| ↓ | 3316 | 3 g of asbestos + 15 ml hydrochloric acid + 10 ml of water / immediate drying on hot plate |
| ↓ | 3317 | 3 g of asbestos + 20 ml hydrochloric acid + 5 ml of water / immediate drying on hot plate |
| ↓ | 3318 | 3 g of asbestos + 25 ml hydrochloric acid / immediate drying on hot plate |

586

| | | |
|---|---|---|
| various yellows with orange tone ↓ | 3319 | production process: 3 g of asbestos + 5 ml hydrochloric acid + 20 ml of water / soaking: 5 d. / drying in oven at 100 °F |
| | 3320 | 3 g of asbestos + 10 ml hydrochloric acid + 15 ml of water / soaking: 5 d. / drying in oven at 100 °F |
| | 3321 | 3 g of asbestos + 15 ml hydrochloric acid + 10 ml of water / drying: 5 d. / drying in oven at 100 °F |
| | 3322 | 3 g of asbestos + 20 ml hydrochloric acid + 5 ml of water / soaking: 5 d. / drying in oven at 100 °F |
| | 3323 | 3 g of asbestos + 25 ml hydrochloric acid / soaking: 5 d. / drying in oven at 100 °F |
| yellow much more orange than «yellow (light orange tone)» | 3324 | mineral : PbO<br>powder : yellow (light orange tone)<br><br>production process:<br>irradiated with electrons at 164,800 rad<br><br>(followed at «dark yellow ochre») |
| yellow (orange tone) | 3325 | mineral : steatite<br>rock : light cold grey, slightly translucid<br>powder : light grey<br>origin : East Broughton, Québec<br><br>production process:<br>30 g of steatite + 100 ml hydrochloric acid or steatite entirely covered with hydrochloric acid / soaking: 5 mo. / natural drying |
| yellow (orange tone) | 3326 | mineral : chalcocite<br>rock : dark iron-grey (with localized turquoise oxidation)<br>powder : dark iron-grey<br>origin : Butte, Montana, United States<br><br>production process:<br>0↑1900 °F (dark iron-grey): .60 g + 50 ml hydrochloric acid / soaking: 2 wk. / drying on hot plate |
| | | mineral : calcite<br>rock : light pink |

| | | |
|---|---|---|
| yellow (orange tone) | 3327 | powder : pinkish white<br>origin : Huddersfield district, Pontiac county, Québec<br><br>production process:<br>0↑1800 °F (medium brownish grey): 2 g + 80 ml hydrochloric acid / soaking: 2 wk. / drying on hot plate |
| yellow (orange tone) | 3328 | mineral : diopside<br>rock : light grey<br>powder : light beige<br>origin : Mont Orford, Québec<br><br>production process:<br>1 g of diopside + 50 ml nitric acid / soaking: 2 wk. / drying on hot plate |
| yellow (orange tone) | 3329 | mineral : bauxite[92]<br>powder : pinkish beige, mat<br>origin : Alcan Company, French Guyana<br><br>production process:<br>(followed from «rusty orange [pink tone]»)<br>0↑1500 °F (pinkish chamois): 3 g + 5 ml nitric acid + 20 ml hydrochloric acid / soaking: 3 d. / drying on hot plate |
| various yellows with orange tone ↓ | 3330 | production process:<br>(followed from «olive-green [yellow tone]»)<br>0↑1200 °F (pinkish chamois lighter than at 1100 °F): 3 g + 25 ml hydrochloric acid / soaking: 3 d. / drying on hot plate |
| | 3331 | 0↑1300 °F (pinkish chamois lighter than at 1200 °F): 3 g + 25 ml hydrochloric acid / soaking: 3 d. / drying on hot plate |
| | 3332 | 0↑1400 °F (pinkish chamois lighter than at 1300 °F): 3 g + 25 ml hydrochloric acid / soaking: 3 d. / drying on hot plate |
| | 3333 | 0↑1500 °F (pinkish chamois lighter than at 1400 °F): 3 g + 25 ml hydrochloric acid / soaking: 3 d. / drying on hot plate<br>(followed at «vivid orange») |
| | | mineral : calcite (with clayey inclusions)<br>rock : very light creamy yellow, translucid<br>powder : white<br>origin : De-Mix quarry, near Saint-Philippe de Laprairie, Québec |

| | | |
|---|---|---|
| yellow (orange tone fairly pronounced) | 3334 | <u>production process:</u><br>(followed from «yellow [beige tone]»)<br>rock irradiated with gamma rays at 201.6 Mrad<br>(followed at «yellow [light brown tone]») |
| yellow (orange tone) | 3335 | mineral : microcline<br>rock : white (grey reflection)<br>powder : white (grey reflection)<br>origin : Buckingham, Québec<br><br><u>production process:</u><br>(followed from «yellow ochre»)<br>granules irradiated with gamma rays at 360 Mrad |
| yellow (orange tone) | 3336 | mineral : solid epidote<br>rock : brownish green<br>powder : brownish green<br>origin : James Bay, Québec<br><br><u>production process:</u><br>12 g of epidote + 40 ml hydrochloric acid / soaking: 14 d. / separation of the liquid and the solid / natural drying (colour of the solid: vivid yellow) / irradiated with electrons at 164,200 rad |
| yellow (orange tone)<br>↓ | 3338 | mineral : PbO<br>powder : yellow (light orange tone)<br><br><u>production process:</u><br>irradiated with gamma rays at:<br>5 Mrad |
| darker yellow (orange tone) | 3339 | 10 Mrad<br>(followed at «orange-yellow [brown tone]») |
| yellow (orange tone) a bit more luminous than «yellow (orange tone)» | 3340 | mineral : chalcocite<br>rock : dark iron-grey (with localized turquoise oxidation)<br>powder : dark iron-grey<br>origin : Butte, Montana, United States<br><br><u>production process:</u><br>0↑1900 °F (dark iron-grey): .60 g + 50 ml hydrochloric acid / soaking: 2 wk. / drying on hot plate (yellow [orange tone]) / irradiated with gamma rays[239] at:<br>64.7 Mrad |

| | | |
|---|---|---|
| yellow (orange tone) much more orange, intense and luminous | 3341 | 424.7 Mrad |
| medium and fairly vivid yellow (orange tone) | 3342 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>(followed from «greyish cream [yellow tone]»)<br>0†1900 °F (light grey [beige tone]): .50 g + 50 ml nitric acid / soaking: 2 wk. / drying on hot plate (very light greyish cream) / irradiated with gamma rays at 424.7 Mrad[239] |
| medium and fairly vivid yellow (orange tone) | 3343 | mineral : pyrophyllite<br>rock : light beige (grey and pink tones), opaque<br>powder : very light beige (grey and orange-pink tones)<br>origin : Carpentier district, Abitibi, Québec<br><br><u>production process:</u><br>1 g of pyrophyllite + 50 ml nitric acid / soaking: 2 wk. / drying on hot plate |
| yellow (orange tone) a bit darker than «medium yellow (orange tone)» | 3344 | <u>production process:</u><br>1 g of pyrophyllite + 50 ml nitric acid / soaking: 2 wk. / drying on hot plate (medium and fairly vivid yellow [orange tone]) / irradiated with gamma rays at 64.7 Mrad<br>(followed at «medium brown [orange tone]») |
| vivid yellow (orange tone) | 3345 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>3 g of asbestos + 20 ml hydrochloric acid / soaking: 24 h / drying on hot plate |
| vivid yellow (orange tone) | 3345.1 | <u>production process:</u><br>3 g of asbestos + 25 ml hydrochloric acid / immediate drying on hot plate |
| vivid yellow | 3346 | <u>production process:</u><br>50 g of asbestos + 100 ml hydrochloric acid / soa- |

| | | |
|---|---|---|
| (orange tone) | | king: 5 mo. / drying on hot plate[508] |
| vivid yellow (orange tone) | 3347 | production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]) / 1300 °F / 1 h (pronounced orange) / irradiated with electrons at 164,800 rad |
| vivid yellow (light orange tone) | 3348 | mineral : calcite<br>rock : light pink<br>powder : pinkish white<br>origin : Huddersfield district, Pontiac county, Québec<br><br>production process:<br>4 g of calcite + 20 ml hydrochloric acid / soaking: 3 d. / drying on hot plate |
| vivid yellow (orange tone) | 3349 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «medium orange [localized green reflection]»)<br>.30 g of galena + .30 g of sulphur + .30 g of sodium carbonate / deposited on a piece of glass measuring 1" x 1" x 1/8" / 0↑1800 °F / slow cooling in furnace[280] |
| fairly vivid yellow (orange tone) | 3350 | mineral : haematite<br>rock : medium chocolate-brown<br>powder : medium chocolate-brown<br>origin : Nouveau Québec, Québec<br><br>production process:<br>(followed from «light greenish yellow [localized orange tone]»)<br>4 g of heamatite + 100 ml sulphuric acid / soaking: 2 wk. / drying on hot plate (very, very light cream, almost white [light orange tone]) / irradiated with electrons at 302,831 rad[45] |

| | | |
|---|---|---|
| vivid yellow (orange tone) | 3351 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>0†900 °F (fairly dark beige [yellow tone]): 1 g + 40 ml hydrochloric acid / soaking: 1 wk. / drying on hot plate |
| yellow (orange tone) more yellow and less red than «vivid yellow (orange tone)» | 3352 | mineral : orpiment<br>rock : vivid yellow (orange tone)<br>powder : vivid yellow (orange tone)<br>origin : Nevada, United States<br>production process:<br>powder irradiated with electrons at 302,831 rad[36] |
| yellow (orange tone) more vivid than «vivid yellow (orange tone)» | 3353 | production process:<br>rock hermetically wrapped in bread dough / irradiated with gamma rays at 5.7 Mrad |
| yellow (orange tone) much more vivid than «vivid yellow (orange tone)» | 3354 | production process:<br>powder irradiated with gamma rays at 122.984 Mrad[509]<br><br>(followed at «orange-yellow [light brown tone]») |
| very vivid yellow (orange tone) | 3355 | mineral : serandite<br>rock : beige (light pinkish orange tone), opaque<br>powder : light pink<br>origin : De-Mix quarry, North side of Mont Saint-Hilaire, Rouville county, Québec<br>production process:<br>12 g of serandite + 40 ml hydrochloric acid / natural drying |
| mixture of particles | | |
| | | mineral : pyrophyllite<br>rock : light beige (grey and pink tones), opaque<br>powder : very light beige (grey and orange- |

| | | |
|---|---|---|
| | | pink tones) origin : Carpentier district, Abitibi, Québec<br><br>production process:<br>0↑1900 °F (light beige): .20 g + 50 ml hydrochloric acid / soaking: 2 wk. / drying on hot plate |
| yellow (orange tone) / white | 3356 | |
| yellow (orange tone and green reflection) | | |
| light yellow (orange tone and localized green reflection) | 3357 | mineral : galena<br>rock : dark grey, with metallic brilliance<br>powder : dark grey, with metallic brilliance<br>origin : Trail, British Columbia<br><br>production process:<br>(followed from «yellowish orange [green reflection] more vivid than "medium and vivid yellowish orange"»)<br>1 g of powdered galena deposited on a piece of glass measuring 1" x 1" x 1/8" / 0↑1800 °F / slow cooling in furnace[28°] |
| orange-yellow (greyish green tone) | | |
| pale orange-yellow (greyish green tone) | 3358 | mineral : vesuvianite<br>rock : lilac<br>powder : lilac<br>origin : John Mansville Mine, Asbestos, Québec<br><br>production process:<br>(followed from «light greenish yellow [grey tone]»)<br>0↑1200 °F (white [grey reflection]): .50 g + 40 ml hydrochloric acid / natural drying |
| orange-yellow (pink tone) | | |
| light orange-yellow (light pink tone) | 3359 | mineral : sphalerite[27]<br>rock : dark grey, with golden yellow metallic brilliance<br>powder : dark brownish grey<br>origin : Matagami Mine, Matagami, Québec<br><br>production process:<br>0↑1800 °F (medium chocolate-brown): 1 g + 50 ml sulphuric acid / soaking: 2 wk. / drying on hot plate (white) / irradiated with gamma rays at 64.7 Mrad<br>(followed at «dark brownish beige [pink tone]») |
| orange-yellow (beige tone) | | |
| | | mineral : pyrophyllite |

| | | |
|---|---|---|
| medium orange-yellow (beige tone) | 3360 | rock : light beige (grey and pink tones), opaque<br>powder : very light beige (grey and orange-pink tones)<br>origin : Carpentier district, Abitibi, Québec<br><br>production process:<br>1 g of pyrophyllite + 80 ml hydrochloric acid / soaking: 2 wk. / drying on hot plate (light yellow [orange tone]) / irradiated with gamma rays at 424.7 Mrad[81,239] |
| orange-yellow (brown tone) | | |
| | | mineral : fluorescent calcite<br>rock : white (grey or brown localized reflection), translucid<br>powder : white (yellow reflection)<br>origin : Bancroft, Ontario<br><br>production process:<br>(followed from «light yellow [orange tone]»)<br>rock irradiated with gamma rays at: |
| orange-yellow (light brown tone) a bit darker than «light orange-yellow (brown tone)» ↓ | 3361 | 148.4 Mrad |
| darker orange-yellow (brown tone a bit more accentuated) ↓ | 3362 | 201.6 Mrad |
| orange-yellow still a bit darker ↓ | 3363<br>3364 | 244.53 Mrad<br>247.6 Mrad |
| orange-yellow still a bit darker | 3365 | 360 Mrad[504]<br><br>(followed at «brownish orange») |
| | | mineral : hornblende<br>rock : medium evergreen (light grey tone), with vitreous luster<br>powder : medium cold grey (light green tone)<br>origin : Abitibi, Québec<br><br>mineral : sulphur<br>rock : brilliant yellow<br>powder : brilliant yellow<br>origin : unknown |

| | | |
|---|---|---|
| orange-yellow [tends towards brown], with warm luster | 3366 | <u>production process:</u><br>2 g of hornblende + 2 g of sulphur / 1300 °F / 1 h |
| orange-yellow (brown tone)<br>↓ | 3367 | mineral : PbO<br>powder : yellow (light orange tone)<br><br><u>production process:</u><br>(followed from «yellow [orange tone]»)<br>irradiated with gamma rays at:<br>57.4 Mrad |
| orange-yellow more intense and brown<br>↓ | 3368 | 63.984 Mrad |
| orange-yellow still more intense and brown | 3369 | 102.4 Mrad<br><br>(followed at «olive-green») |
| orange-yellow (light brown tone) still more vivid than «vivid orange-yellow (brown tone)» | 3370 | mineral : orpiment<br>rock : vivid yellow (orange tone)<br>powder : vivid yellow (orange tone)<br>origin : Nevada, United States<br><br><u>production process:</u><br>(followed from «yellow [orange tone] much more vivid than "vivid yellow [orange tone]"»)<br>powder irradiated with gamma rays at 482.984 Mrad[509] |
| orange-yellow (grey tone) | | |
| pale orange-yellow (grey tone) | 3371 | mineral : vesuvianite<br>rock : lilac<br>powder : lilac<br>origin : John Mansville Mine, Asbestos, Québec<br><br><u>production process:</u><br>0↑1000 °F (grey [lilac tone]): .50 g + 40 ml hydrochloric acid / natural drying<br>(followed at «light greenish yellow [grey tone]») |
| yellow (copper tone) | | |
| | | mineral : biotite gneiss<br>rock : blackish grey, golden vitreous brilliance |

595

| | | |
|---|---|---|
| | | origin : geological province of Grenville, Québec |
| | | production process: |
| | | (followed from «dark chocolate-brown [with white gold metallic brilliance]») |
| yellow (copper tone) with metal-lic reflection | 3372 | 0↑1500 °F |
| | | (followed at «dark reddish brown [golden reflec-tion]») |

ORANGE (YELLOW TONE)

| colour obtained | number | mineral / production process |
|---|---|---|
| colour between «light Naples yellow» and «light orange» | 3373 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>rock hermetically wrapped in bread dough / 1600 °F / 30 min. / cooling (blackish grey) / the dough is removed from the rock which is heated again in ambient air 0↑1500 °F / removal of the «light Naples yellow cristals» formed at the surface of the rock: .30 g of cristals + 25 ml nitric acid / natural drying / once the cristals are dried, they are heated on a hot plate / colour of the cristals (followed at «light orange [beige tone]») |
| medium orange (yellow and brown tones) | 3374 | mineral : clay<br>rock : block:pale greyish green<br>powder : pale greyish green<br>origin : bank of St.-Lawrence river, at the rear of the Miguasha Museum, Gaspésie, Québec<br><br><u>production process:</u><br>1 g of clay + 50 ml hydrochloric acid / soaking: 2 wk. / drying on hot plate |
| medium and vivid orange (yellow tone and localized green reflection) | 3375 | mineral : galena<br>rock : dark grey, with metallic brilliance<br>powder : dark grey, with metallic brilliance<br>origin : Trail, British Columbia<br><br><u>production process:</u><br>(followed from «dark olive-green [localized orange reflection]»)<br>1 g of powdered galena deposited on a piece of glass measuring 1" x 1" x 1/8" / 0↑1600 °F / slow cooling in furnace[280] |

| | | |
|---|---|---|
| ↓<br>orange (yellow tone) still more vivid (localized green reflection) | 3376 | 1 g of powdered galena deposited on a piece of glass measuring 1" x 1" x 1/8" / 0↑1700 °F / slow cooling in furnace[280]<br>(followed at «light yellow [orange tone and localized green reflection]») |
| | | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «medium orange [brown tone]») |
| vivid orange (yellow tone)<br>↓ | 3377 | .45 g of powdered galena + .45 g of sulphur / deposited on a piece of glass measuring 1" x 1" x 1/8" / 0↑1700 °F / slow cooling in furnace[280] |
| orange (yellow tone) still more vivid (localized green reflection) | 3378 | .45 g of powdered galena + .45 g of sulphur / deposited on a piece of glass measuring 1" x 1" x 1/8" / 0↑1800 °F / slow cooling in furnace[280] |
| | | mineral : bornite<br>rock : reddish brown (with localized green and bluish green oxidation)<br>powder : reddish brown<br>origin : Lac Musset, Fosse du Labrador, Québec<br><br>production process: |
| 2 areas: vivid orange (yellow tone) / dark iron-grey (localized green reflection) | 3378.1 | 1 g of bornite + 5 g of pyrex / manual grinding / heating: 5 °C per min. from 0↑1245 °C + maintenance during 1 h / cooling: 5 °C per min. until ambient temperature is reached / the entity is done in ambient air |
| 2 areas: orange (yellow tone) a bit more accentuated and vivid than «vivid orange (yellow tone)» / iron-grey slightly more accentuated than «dark iron-grey [localized green reflection]» | 3378.2 | production process:<br>1 g of bornite + 5 g of pyrex / manual grinding / heating: 5 °C per min. from 0↑1245 °C + maintenance during 1 h / cooling: 5 °C per min. until ambient temperature is reached / the entity is done in ambient air (2 areas: vivid yellowish orange / dark iron-grey [localized green reflection]) / irradiated with gamma rays at 9.88 Mrad |

ORANGE[511]

| colour obtained | number | mineral / production process |
|---|---|---|
| orange (lilac tone) | | |
| orange (light pinkish lilac reflection) | 3379 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «crimson-violet»)<br>rock irradiated with gamma rays at 244.53 Mrad<br>(followed at «medium brown [orange tone and light pinkish lilac reflection]») |
| orange (green tone) | | |
| greenish orange, mat | 3380 | mineral : bornite<br>rock : reddish brown (with localized green and bluish green oxidation)<br>powder : reddish brown<br>origin : Lac Musset, Fosse du Labrador, Québec<br><br>production process:<br>(followed from «mixture of particles: dark greenish turquoise / dark olive-green»)<br>1 g of bornite + 10 ml hydrochloric acid / soaking: 6 d. / separation of the liquid and the solid / natural drying / colour of the solid[54]<br>(followed at «medium beige [orange tone], mat») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «mossy green more accentuated than "pale mossy green"») |

599

| | | |
|---|---|---|
| orange (light green tone) | 3381 | 2 g of iron sulphide - nickel + 2 g of sodium carbonate / 0↑1600 °F + 1 h at 1600 °F<br>(followed at «orange») |
| orange (light green tone) | 3382 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «light orange»)<br>250 g of asbestos + 1650 ml hydrochloric acid in a 2000 ml becher or asbestos entirely covered with hydrochloric acid in a vertical container / soaking: 1 wk. / drying on hot plate / formation of 3 superposed layers of colours / colour of the layer which is in the middle[512]<br>(followed at «apple-green») |
| orange (very light green tone) more accentuated than «greenish orange darker and more accentuated than "light greenish orange"» | 3383 | mineral : serpentine<br>rock : yellowish green<br>powder : light greenish yellow<br>origin : probably Thetford Mines, Eastern Townships, Québec<br><br>production process:<br>(followed from «yellowish green more pronounced than "light yellowish green"»)<br>1.50 g of serpentine + 50 cc of transparent polyester resin + 1% of catalyst / manual grinding / moulding / hardening (light green [olive-green type]) / irradiated with gamma rays at 34.2 Mrad |
| orange (accentuated olive-green tone) | 3384 | mineral : andulusite<br>rock : light brownish grey<br>powder : light grey<br>origin : Bimbowrie, South Australia<br><br>production process:<br>4 g of andulusite + 80 ml hydrochloric acid / soaking: 2 wk. / separation of the liquid and the solid / drying on hot plate (colour of the liquid: olive-green more intense than «light olive-green») / irradiated with gamma rays at 70.4 Mrad<br>(followed at «greenish yellow ochre») |

| | | |
|---|---|---|
| greenish orange<br>↓<br>orange (green tone more accentuated) | 3385<br><br>3386 | mineral : dolomite<br>rock : white (localized yellow reflection), crystalline and translucid<br>powder : white<br>origin : Bristol district, Pontiac county, Québec<br><br><u>production process:</u><br>(followed from «orange»)<br>2 g of dolomite + 2 g of sodium carbonate:<br>0↑1600 °F + 1 h at 1600 °F<br><br>0↑1700 °F + 1 h at 1700 °F<br>(followed at «very pale apple-green») |
| medium orange (localized green reflection) | 3387 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br><u>production process:</u><br>.30 g of galena + .30 g of sulphur + .30 g of sodium carbonate / deposited on a piece of glass measuring 1" x 1" x 1/8" / 0↑1700 °F / slow cooling in furnace[280]<br>(followed at «vivid yellow [orange tone]») |
| medium greenish orange | 3388 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br><u>production process:</u><br>.10 g of calcite + .50 g of chrome / 1700 °F / 1 h (yellowish green): .3 g + 50 cc of transparent polyester resin + 1% of catalyst / manual grinding / moulding / hardening (light and vivid apple-green) / irradiated with gamma rays at 5.7 Mrad |
| | | mineral : steatite<br>rock : light evergreen<br>powder : white<br>origin : East Broughton, Québec |

| | | |
|---|---|---|
| medium greenish orange | 3389 | production process:<br>(followed from «orange [brown tone]»)<br>0↑1500 °F (light brownish grey): 2 g + 20 ml hydrochloric acid / soaking: 3 d. / drying on hot plate<br>(followed at «orange [brick-orange type]») |
| pronounced orange (light green tone) | 3390 | mineral : stibnite<br>rock : dark grey, with metallic brilliance<br>powder : dark grey, with metallic brilliance<br>origin : Hunan, China<br><br>mineral : sulphur<br>rock : brilliant yellow<br>powder : brilliant yellow<br>origin : unknown<br><br>production process:<br>2 g of stibnite + 2 g of sulphur / 1400 °F / 2 h and more[513] |
| mixture of particles | | |
| greenish orange / creamy yellow | 3391 | mineral : spodumene<br>rock : pale green<br>powder : light grey, almost white<br>origin : Québec Lithium Co., Barauta, Abitibi, Québec<br><br>production process:<br>0↑1900 °F (medium brownish grey): .20 g + 50 ml hydrochloric acid / soaking: 2 wk. / drying on hot plate (orange) / irradiated with gamma rays at 64.7 Mrad[514]<br>(followed at «dark greyish brown») |
| orange | | |
| pale orange | 3392 | mineral : sericite shale<br>rock : light grey (green reflection)<br>powder : very, very light grey<br>origin : Magog, Québec<br><br>production process:<br>(followed from «light yellowish beige»)<br>2 g of shale + 2 g of sodium carbonate / 0↑1600 °F + 1 h at 1600 °F<br>(followed at «Naples yellow») |
| | | mineral : serpentine<br>rock : yellowish green<br>powder : light greenish yellow |

| | | |
|---|---|---|
| pale orange | 3393 | origin : probably Thetford Mines, Eastern Townships, Québec<br><br>production process:<br>(followed from «light brown [orange tone]»)<br>2 g of serpentine + 2 g of sodium carbonate / 0↑1400 °F + 1 h at 1400 °F<br>(followed at «beige [brown tone]») |
| pale orange | 3395 | mineral : sylvite<br>rock : colourless<br>powder : colourless<br>origin : Strassfurt, Prussia, Germany<br><br>production process:<br>rock irradiated with a UV laser beam during 0.5 min. on a 0.16 $cm^2$ surface with a laser energy of 0.180 Joule having a flux of 1.8 x $10^7$ W / $cm^2$ which gives a total energy of 54 Joules<br>(followed at «orange») |
| orange a bit more pale than «very, very light orange» | 3396 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml nitric acid / soaking: 3 d. / drying on hot plate (very, very light orange) / irradiated with gamma rays at 64.7 Mrad<br>(followed at «mixture of particles: beige [orange tone] / brown [orange tone]») |
| orange a bit more intense than «very, very light orange» | 3397 | production process:<br>2 g of fluorine + 20 ml nitric acid / soaking: 3 d. / drying on hot plate (very, very light orange) / irradiated with electrons at 162,431 rad<br>(followed at «very pale orange [beige tone]») |
| very, very light orange | 3398 | mineral : mussel shell or calcium carbonate<br>shell : dark indigo-blue (violet tone)<br>powder : white<br>origin : St.-Lawrence river, Baie-des-Chaleurs, Gaspésie, Québec<br><br>production process:<br>.50 g of powdered shell + 50 ml nitric acid / soaking: 2 wk. / drying on hot plate |

603

| | | |
|---|---|---|
| very, very light orange | 3399 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml nitric acid / soaking: 3 d. / drying on hot plate |
| orange more accentuated than «very, very light orange» | 3400 | mineral : agate<br>rock : dark grass-green, slightly translucid<br>powder : light grey (light green tone)<br>origin : bank of St.-Lawrence river, region of Maria, Gaspésie, Québec<br><br>production process:<br>(followed from «beige [orange tone]»)<br>1 g of agate + 1 cc of white opaque synthetic enamel paint for the car / manual grinding / application on a piece of steel sheet used for the car's body and measuring 1" x 1" (very, very light greyish green, almost white]) / irradiated with gamma rays at 360 Mrad |
| very light orange | 3401 | mineral : apatite<br>rock : pale brownish green<br>powder : very light greyish green<br>origin : Black Lake, Thetford county, Québec<br><br>production process:<br>2 g of apatite + 20 ml hydrofluoric acid /soaking: 24 h / drying in a drying oven at 100 °F24 |
| very light orange | 3402 | mineral : cryolite<br>rock : white, crystalline and translucid<br>powder : white<br>origin : Ivigtut, Groenland<br><br>production process:<br>4 g of cryolite + 50 ml sulphuric acid / soaking: 2 wk. / drying on hot plate (white) / irradiated with electrons at 162,431 rad |
| | | mineral : honey grossular garnet<br>rock : light pinkish beige<br>powder : very light beige<br>origin : Jeffrey Mine, Asbestos (presently |

| | | |
|---|---|---|
| | | J.-M. Asbestos), Québec |
| | | <u>production process:</u> |
| very light orange | 3403 | rock heated at 1500 °F / 1 h[24] |
| | | mineral : kaolin<br>rock : chalk-white (yellow reflection)<br>powder : chalk-white (yellow reflection)<br>origin : Saint-Rémi d'Amherst, Québec |
| | | <u>production process:</u><br>2 g of kaolin + 2 g of sodium carbonate: |
| very light orange | 3404 | 0↑1500 °F + 1 h at 1500 °F |
| ¦ | | (followed at «beige [orange tone]») |
| ¦ | | (followed from «beige [orange tone]») |
| orange a bit darker | 3405 | 0↑1700 °F + 1 h at 1700 °F |
| dark orange | 3406 | 0↑1800 °F + 1 h at 1800 °F |
| ↓<br>dark orange | 3407 | 0↑1900 °F + 1 h at 1900 °F |
| | | mineral : serpentine<br>rock : yellowish green<br>powder : light greenish yellow<br>origin : probably Thetford Mines, Eastern Townships, Québec |
| | | <u>production process:</u> |
| very light orange | 3408 | .3 g of serpentine + 50 cc of transparent polyester resin + 1% of catalyst / manual grinding / moulding / hardening (light beige [light yellow reflection]) / irradiated with gamma rays at 5.7 Mrad |
| | | mineral : fuel oil soot[86]<br>powder : profound brownish black<br>origin : boiler room of Laval University, city of Québec, Québec |
| | | <u>production process:</u> |
| very light orange | 3409 | 2 g of soot + 20 ml sulphuric acid / soaking: 24 h / deposited on hot plate / an immediate bubbling reaction occurs / immediately after the reaction, separation of the liquid and the solid / drying on hot plate (colour of the liquid: grass-green [grey tone], cold and mat): .2 g + 50 cc of transparent polyester resin + 1% of catalyst / manual grinding / moulding / hardening (very, very light yellowish green) / irradiated with gamma rays at |

| | | |
|---|---|---|
| | | 11.4 Mrad |
| | | mineral : serandite<br>rock : white<br>powder : white<br>origin : De-Mix quarry, North side of Mont Saint-Hilaire, Rouville county, Québec<br><br>production process:<br>(followed from «light creamy yellow»)<br>rock irradiated with gamma rays at: |
| very light orange | 3410 | 10 Mrad |
| ↓ fairly vivid orange | 3411 | 57.4 Mrad |
| ↓ orange still more vivid | 3412 | 65.704 Mrad |
| ↓ orange still more vivid | 3413 | 102.4 Mrad |
| ↓ orange still more vivid | 3414 | 124.704 Mrad |
| ↓ orange still more vivid | 3415 | 148.4 Mrad |
| ↓ orange still more vivid | 3416 | 201.6 Mrad<br>(followed at «orange [brown tone]») |
| orange more pronounced than «very light orange» | 3417 | mineral : amazonite<br>rock : greenish turquoise<br>powder : white (turquoise reflection)<br>origin : Lac Saint-Jean, Québec<br><br>production process:<br>2 g of amazonite + 20 ml hydrochloric acid / soaking: 3 d. / drying on hot plate (very light yellowish green): .2 g + 50 cc of transparent polyester resin + 1% of catalyst / manual grinding / moulding / hardening (very light grey [light yellow reflection]) / irradiated with gamma rays at 5.7 Mrad |
| orange more accentuated than | 3418 | mineral : kaolin<br>rock : chalk-white (yellow reflection)<br>powder : chalk-white (yellow reflection)<br>origin : Saint-Rémi d'Amherst, Québec<br><br>production process:<br>2 g of kaolin + 2 g of sodium carbonate / 0↑1500 °F + 1 h at 1500 °F (very light orange) / |

| | | |
|---|---|---|
| «very light orange» | | irradiated with gamma rays at 64.7 Mrad (followed at «medium beige [orange tone]») |
| light orange | 3419 | mineral : blue lace agate<br>rock : light violet-blue, slightly translucid<br>powder : very light grey<br>origin : Africa<br><br>production process:<br>3 g of agate + 40 ml hydrochloric acid / soaking: 1 wk. / separation of the liquid and the solid / natural drying (colour of the solid: white) / irradiated with gamma rays at 64.7 Mrad (followed at «mixture of particles: beige / brown») |
| light orange | 3420 | mineral : asbestos[4]<br>rock : dark grey (green reflection)<br>powder : light grey (green reflection)<br>origin : Asbestos Corporation Ltd., Thetford Mines, Québec<br><br>production process:<br>250 g of asbestos + 1650 ml hydrochloric acid in a 2000 ml becher or asbestos entirely covered with hydrochloric acid in a vertical container / soaking: 1 wk. / drying on hot plate / formation of 3 superposed layers of colours / colour of the layer at the surface[516] (followed at «orange [light green tone]») |
| light orange | 3421 | production process:<br>5 g of asbestos + 100 ml sulphuric acid / soaking: 2 wk. / drying on hot plate (almost pure white [light yellow reflection]) / 1300 °F / 1 h[517] |
| light orange | 3422 | production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) + 40 ml nitric acid / soaking: 5 d. / separation of the liquid and the solid / drying on sand bath / colour of the liquid[518a] |
| light orange | 3423 | production process:<br>(followed from «light chamois [orange pinkish tone]»)<br>0↑1900 °F (chamois [orange tone a bit more accentuated than «light orange tone»]): 50 g + 200 ml hydrochloric acid or asbestos entirely covered |

| | | |
|---|---|---|
| | | with hydrochloric acid / soaking: 1 wk. / drying on hot plate (sunny yellow [light green tone]) / 1000 °F / 1 h |
| pronounced orange | 3424 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (sunny yellow [light green tone]) / 1300 °F / 1 h |
| orange equivalent to the previous one | 3425 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (sunny yellow [light green tone]) / 1400 °F / 1 h |
| orange equivalent to the previous one | 3426 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (sunny yellow [light green tone]) / 1500 °F / 1 h[519] |
| ↓ lighter orange | 3427 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (sunny yellow [light green tone]) / 1600 °F / 1 h (followed at «orange [chamois tone]») |
| light orange | 3428 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>5 g of asbestos + 100 ml sulphuric acid / soaking: 2 wk. / drying on hot plate (almost pure white [light yellow reflection]): 2 g + 2 g of sulphur / 1300 °F / 1 h[518] |
| | | mineral : apatite<br>rock : medium brownish red<br>powder : light pinkish beige |

| | | |
|---|---|---|
| light orange | 3429 | origin : Ile Calumet, Pontiac county, Québec<br><br>production process:<br>.2 g of apatite + 50 cc of transparent polyester resin + 1% of catalyst / manual grinding / moulding / hardening (very, very light beige [weak yellow tone]) / irradiated with gamma rays at 11.4 Mrad |
| light orange | 3430 | mineral : apophyllite<br>rock : milky white, translucid<br>powder : white<br>origin : Gaspé Copper Mine, Gaspé, Québec<br><br>production process:<br>1 g of apophyllite + 60 ml nitric acid / soaking: 2 wk. / drying on hot plate |
| light orange | 3431 | production process:<br>(followed from «milky white [very light orange reflection]»)<br>rock irradiated with gamma rays at:<br>102.4 Mrad |
| ↓ progressively | 3432 | 148.4 Mrad |
| takes a | 3433 | 201.6 Mrad |
| ↓ | 3434 | 247.6 Mrad |
| amber tone | 3435 | 287.3 Mrad<br>(followed at «medium and intense orange [amber tone]») |
| light orange | 3436 | production process:<br>rock covered with 20 ml hydrochloric acid / soaking: 2 wk. / irradiated with gamma rays at 5.7 Mrad / drying on sand bath, completed on hot plate |
| light orange | 3437 | mineral : beryl<br>rock : very light yellowish green, slightly translucid<br>powder : white (green reflection)<br>origin : Lacorne district, Abitibi, Québec<br><br>production process:<br>.3 g of beryl + 50 cc of transparent polyester resin + 1% of catalyst / manual grinding / moulding / hardening (white [light yellow reflection]) / irradiated with gamma rays at 11.4 Mrad |
| | | mineral : bornite<br>rock : reddish brown (with localized green |

| | | |
|---|---|---|
| | | and bluish green oxidation)<br>powder : reddish brown<br>origin : Lac Musset, Fosse du Labrador, Québec |
| light orange | 3438 | production process:<br>2 g of bornite + 20 ml hydrochloric acid + 5 ml nitric acid / soaking: 6 d. / separation of the liquid and the solid / natural drying (colour of the solid: very light yellowish green) / irradiated with electrons at 164,800 rad<br>(followed at «orange-cream [green tone]») |
| | | mineral : chalcocite<br>rock : dark iron-grey (with localized turquoise oxidation)<br>powder : dark iron-grey<br>origin : Butte, Montana, United States |
| light orange | 3439 | production process:<br>0†1900 °F (dark iron-grey): 1 g + 80 ml nitric acid / soaking: 2wk. / separation of the liquid and the solid / desiccation (colour of the liquid: dark green) / irradiated with electrons at 162,431 rad |
| | | mineral : fluorine<br>rock : light pink, translucid<br>powder : white (light pink reflection)<br>origin : Saint-Lawrence Fluorspar Company, Saint-Lawrence, Newfoundland<br><br>mineral : calcite[11]<br>powder : white<br>origin : Calcite du Nord Company, Saint-Eugène de Mistassini, Lac Saint-Jean, Québec |
| light orange | 3440 | production process:<br>1 g of fluorine + 1 g of calcite / 1000 °C / 1 h |
| | | mineral : biotite gneiss<br>rock : blackish grey, golden vitreous brilliance<br>powder : dark grey<br>origin : Grenville geological province, Québec |
| light orange | 3441 | production process:<br>12 g of gneiss + 40 ml sulphuric acid / soaking: 22 d. / drying on hot plate (mixture of particles: white / light beige) / irradiated with electrons at 164,800 rad<br>(followed at «medium orange [beige tone]») |

| | | |
|---|---|---|
| light orange | 3442 | mineral : honey grossular garnet<br>rock : light pinkish beige<br>powder : very light beige<br>origin : Jeffrey Mine, Asbestos (presently J.-M. Asbestos), Québec<br><br>production process:<br>(followed at «beige»)<br>rock irradiated with gamma rays at 360 Mrad<br>(followed at «light brown») |
| light orange | 3443 | mineral : microcline<br>rock : white (grey reflection)<br>powder : white (grey reflection)<br>origin : Buckingham, Québec<br><br>production process:<br>0↑1900 °F (light grey): .50 g + 50 ml hydrochloric acid / soaking: 2 wk. / drying on hot plate[520] |
| light orange | 3444 | mineral : olivine<br>powder : colourless (green reflection)<br>origin : Mount Haven, United States<br><br>production process:<br>(followed from «beige tone»)<br>powder irradiated with gamma rays at 424.7 Mrad |
| light orange | 3445<br>3446 | mineral : molten glass<br>solid : transparent white<br><br>production process:<br>molten glass irradiated with gamma rays at 5.7 Mrad<br>(followed at «light orange [caramel tone]») |
| light orange | 3447<br>3448 | mineral : polylithionite<br>rock : transparent (beige reflection)<br>powder : transparent (beige reflection)<br>origin : De-Mix quarry, North side of Mont Saint-Hilaire, Rouville county, Québec<br><br>production process:<br>(followed from «beige»)<br>.20 g of polylithionite + 50 ml sulphuric acid / soaking: 2 wk. / drying on hot plate (beige tone) / irradiated with gamma rays at 424.7 Mrad |
| | | mineral : serpentine<br>rock : yellowish green |

| | | |
|---|---|---|
| light orange | 3449 | powder : light greenish yellow<br>origin : probably Thetford Mines, Eastern Townships, Québec<br><br>production process:<br>.2 g of serpentine + 50 cc of transparent polyester resin + 1% of catalyst / manual grinding / moulding / hardening (pale yellowish grey) / irradiated with gamma rays at 11.4 Mrad |
| light orange | 3450 | mineral : siderite<br>rock : caramel-brown (grey tone)<br>powder : light beige (orange tone)<br>origin : De-Mix quarry, North side of Mont Saint-Hilaire, Rouville county, Québec<br><br>production process:<br>3 g of siderite + 20 ml hydrochloric acid / soaking: 3 d. / drying on hot plate |
| light orange | 3451 | mineral : steatite<br>rock : light cold grey, slightly translucid<br>powder : light grey<br>origin : East Broughton, Québec<br><br>production process:<br>2 g of steatite + 25 ml hydrochloric acid / soaking: 3 d. / drying on hot plate (followed at «medium beige [light orange tone]») |
| light orange | 3452 | production process:<br>20 g of steatite + 100 ml nitric acid / soaking: 5 mo. / natural drying |
| light orange | 3453 | production process:<br>30 g of steatite + 100 ml nitric acid / soaking: 1 wk. / drying on hot plate[521] |
| light orange | 3454 | mineral : clay<br>block : pale greyish green<br>powder : pale greyish green<br>origin : bank of St.-Lawrence river, at the rear of the Miguasha Museum, Gaspésie Québec<br><br>production process:<br>0†1900 °F (medium brown [orange-red tone]): 1 g + 50 ml hydrochloric acid / soaking: 2 wk. / drying on hot plate (medium rusty orange) / irradiated with electrons at 162,431 rad |

612

| | | |
|---|---|---|
| light orange | 3455 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «khaki-green [between "orange" and "green"]»)<br>0↑1000 °F (grey [accentuated beige tone]): 5 g + 25 ml nitric acid / soaking: 3 d. / drying on hot plate<br>(followed at «rusty orange» and at «beige [light orange tone]») |
| vivid light orange | 3456 | mineral : amazonite<br>rock : greenish turquoise<br>powder : white (turquoise reflection)<br>origin : Lac Saint-Jean, Québec<br><br>production process:<br>2 g of amazonite + 20 ml sulphuric acid / soaking: 3 d. / drying on hot plate (cream [very light green tone]): .2 g + 50 cc of transparent polyester resin + 1% of catalyst / manual grinding / moulding / hardening (light grey [light yellow reflection]) / irradiated with gamma rays at 11.4 Mrad |
| vivid light orange | 3457 | production process:<br>.2 g of amazonite + 50 cc of transparent polyester resin + 1% of catalyst / manual grinding / moulding / hardening (very, very light greenish yellow) / irradiated with gamma rays at 11.4 Mrad |
| vivid light orange | 3458 | mineral : beryl<br>rock : light blue, slightly translucid<br>powder : light grey<br>origin : Abitibi, Québec<br><br>production process:<br>2 g of beryl + 25 ml sulphuric acid / soaking: 24 h / drying on hot plate (very light greyish beige): .3 g + 50 cc of transparent polyester resin + 1% of catalyst / manual grinding / moulding / hardening (light brownish grey) / irradiated with gamma rays at 11.4 Mrad |

| | | |
|---|---|---|
| vivid light orange | 3459 | <u>production process:</u> 2 g of beryl + 25 ml nitric acid / soaking: 24 h / drying on hot plate (light blue [light green or yellow tone]): .3 g + 50 cc of transparent polyester resin + 1% of catalyst / manual grinding / moulding / hardening (very light yellow or green tone) / irradiated with gamma rays at 11.4 Mrad |
| vivid light orange | 3460 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u> 2 g of fluorine + 20 ml nitric acid / soaking: 3 d. / drying on hot plate (light orange [beige tone]): .2 g + 50 cc of transparent polyester resin + 1% of catalyst / manual grinding / moulding / hardening (very light grey [light yellow reflection]) / irradiated with gamma rays at 4.5 Mrad |
| vivid light orange | 3461 | <u>production process:</u> .2 g of fluorine + 50 cc of transparent polyester resin + 1% of catalyst / manual grinding / moulding / hardening (light brownish grey [light yellow reflection]) / irradiated with gamma rays at 5.7 Mrad |
| vivid light orange | 3462 | mineral : fluorine<br>rock : light pink, translucid<br>powder : white (light pink reflection)<br>origin : Saint-Lawrence Fluorspar Company, Saint-Lawrence, Newfoundland<br><br><u>production process:</u> 2 g of fluorine + 20 ml hydrochloric acid / soaking: 3 d. / drying on hot plate (orange): .2 g + 50 cc of transparent polyester resin + 1% of catalyst / manual grinding / moulding / hardening (pale grey [beige tone and light yellow reflection]) / irradiated with gamma rays at 11.4 Mrad |
| | | mineral : fluorine<br>rock : white (pink reflection), translucid<br>powder : white (grey reflection)<br>origin : Saint-Lawrence Fluorspar Company, Saint-Lawrence, Newfoundland |

| | | |
|---|---|---|
| vivid light orange | 3463 | <u>production process:</u><br>2 g of fluorine + 20 ml nitric acid / soaking: 3 d. / drying on hot plate (very, very light orange): .2 g + 50 cc of transparent polyester resin + 1% of catalyst / manual grinding / moulding / hardening (very, very light grey [light yellow reflection]) / irradiated with gamma rays at 11.4 Mrad |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland |
| vivid light orange | 3464 | <u>production process:</u><br>2 g of fluorine + 20 ml nitric acid / soaking: 3 d. / drying on hot plate (pink): .2 g + 50 cc of transparent polyester resin + 1% of catalyst / manual grinding / moulding / hardening (light grey [light yellowish green reflection]) / irradiated with gamma rays at 11.4 Mrad |
| vivid light orange | 3465 | <u>production process:</u><br>2 g of fluorine + 20 ml sulphuric acid / soaking: 3 d. / drying on hot plate (white [pinkish beige reflection]): .2 g + 50 cc of transparent polyester resin + 1% of catalyst / manual grinding / moulding / hardening (very light grey [light greenish yellow reflection]) / irradiated with gamma rays at 11.4 Mrad |
| | | mineral : serandite<br>rock : orange-pink or salmon (with more orange areas)<br>powder : pinkish white<br>origin : De-Mix quarry, North side of Mont Saint-Hilaire, Rouville county, Québec |
| vivid light orange | 3466 | <u>production process:</u><br>2 g of serandite + 20 ml hydrochloric acid / soaking: 3 d. / drying on hot plate (beige [orange tone]): .3 g + 50 cc of transparent polyester resin + 1% of catalyst / manual grinding / moulding / hardening (grey [brown and yellow tones]) / irradiated with gamma rays at 4.5 Mrad |
| | | mineral : steatite<br>rock : light cold grey, slightly translucid<br>powder : light grey |

| | | |
|---|---|---|
| vivid light orange | 3467 | origin : East Broughton, Québec<br><br>production process:<br>20 g of steatite + 100 ml nitric acid / soaking: 5 mo. / natural drying (light orange): .3 g + 50 cc of transparent polyester resin + 1% of catalyst / manual grinding / moulding / hardening (very light beige [light yellow tone]) / irradiated with gamma rays at 11.4 Mrad |
| | | production process:<br>0↑1600 °F (brownish grey): 2 g + 5 ml hydrochloric acid + 20 ml nitric acid / soaking: 3 d. / drying on hot plate (light beige): .3 g + 50 cc of transparent polyester resin + 1% of catalyst / manual grinding / moulding / hardening (light beige) / irradiated with gamma rays at: |
| light orange<br>↓ | 3468 | 5.7 Mrad |
| darker orange<br>↓ | 3469 | 11.4 Mrad |
| still darker orange<br>↓ | 3470 | 17.1 Mrad |
| more vivid and pronounced orange | 3471 | 34.2 Mrad |
| orange more accentuated than «light orange» | 3472 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 25 ml hydrochloric acid / soaking: 24 h / drying on hot plate (medium orange-brown [light green tone, khaki-green type]): .2 g + 50 cc of transparent polyester resin + 1% of catalyst / manual grinding / moulding / hardening (light grey [light green reflection]) / irradiated with gamma rays at 5.7 Mrad |
| orange a bit more intense and dark | 3473 | mineral : bauxite[92]<br>powder : pinkish beige, mat<br>origin : Alcan Company, French Guyana<br><br>production process:<br>(followed from «brown [orange tone]»)<br>0↑1500 °F (pinkish chamois): 3 g + 15 ml hydrochloric acid + 10 ml nitric acid / soaking: 3 d. / |

| | | |
|---|---|---|
| than «light orange» | | drying on hot plate (rusty orange [pink tone] lighter than «medium rusty orange [pink tone]»): .3 g + 50 cc of transparent polyester resin + 1% of catalyst / manual grinding / moulding / hardening (light chamois [strong orange tone]) / irradiated with electrons at 305,082 rad[354] |
| | | mineral : microcline<br>rock : white (grey reflection)<br>powder : white (grey reflection)<br>origin : Buckingham, Québec<br><br><u>production process:</u> |
| orange much more accentuated than «light orange» | 3474 | 0↑1900 °F (light grey): .50 g + 50 ml hydrochloric acid / soaking: 2 wk. / drying on hot plate (light orange [same colour as the fruit]) / irradiated with gamma rays at 64.7 Mrad<br>(followed at «brownish orange») |
| | | mineral : bauxite[92]<br>powder : pinkish beige, mat<br>origin : Alcan Company, French Guyana<br><br><u>production process:</u><br>(followed from «green [between "apple-green" and "Paris green "]»)<br>2 g of bauxite + 2 g of sodium carbonate: |
| orange darker than «orange» | 3475 | 0↑1500 °F + 55 min. at 1500 °F |
| light orange | 3476 | 0↑1500 °F + 1 h at 1500 °F[522] |
| orange darker and more accentuated than «light orange» | 3477 | 0↑1600 °F + 1 h at 1600 °F |
| orange still darker and more accentuated | 3478 | 0↑1700 °F + 1 h at 1700 °F |
| orange still darker and more accentuated<br>↓ | 3479 | 0↑1800 °F + 1 h at 1800 °F |
| orange still darker and more accentuated | 3480 | 0↑1900 °F + 1 h at 1900 °F |
| | | mineral : ochre[98]<br>powder : yellow |

| | | |
|---|---|---|
| | | origin : small copper and nickel deposit, in the South-Western area of a mass of serpentinite at 3 km at the West of Saint-Fabien-de-Panet, Québec<br><br>production process: |
| orange more pale than «orange» | 3481 | 2 g of ochre + 2 g of sodium carbonate / 0↑1900 °F + 1 h at 1900 °F (orange [brown tone]) / irradiated with gamma rays at 63.88 Mrad (followed at «pale milky chocolate-brown») |
| | | mineral : mica<br>rock : golden brown, with vitreous luster, translucid<br>powder : light amber, with vitreous luster, translucid<br>origin : Lac Vert mountain, region of Low, near Hincks, Québec<br><br>production process: |
| orange a bit lighter than «orange» | 3482 | 2 g of mica + 2 g of sodium carbonate / 0↑1600 °F + 1 h at 1600 °F (orange) / irradiated with gamma rays at 63.88 Mrad (followed at «mixture of particles: very light greyish beige / white») |
| | | mineral : Gaspé agate<br>rock : marbled nodule with shaded tints of white, pink and grey, slightly translucid<br>powder : very light pinkish grey<br>origin : Mount Lyall, Gaspésie, Québec<br><br>production process: |
| orange | 3483 | 4 g of agate + 40 ml phosphoric acid / soaking: 2 wk. / drying on hot plate (still humid) / colour of the solid[523] |
| | | mineral : asbestos[4]<br>rock : dark grey (green reflection)<br>powder : light grey (green reflection)<br>origin : Asbestos Corporation Ltd., Thetford Mines, Québec<br><br>production process: |
| orange | 3484 | 5 g of asbestos + 80 ml nitric acid / soaking: 2 wk. / drying on hot plate (dark brown [orange tone]) / 1300 °F / 1 h[524] (followed at «medium orange [brown tone]») |
| | | production process:<br>(followed from «yellowish grey») |

| | | |
|---|---|---|
| light orange | 3485 | rock irradiated with gamma rays at:<br>102.4 Mrad |
| ↓ | 3486 | 148.4 Mrad |
| orange a bit more accentuated | 3487 | 201.6 Mrad |
| ↓ at each stage | 3488 | 247.6 Mrad |
| | 3489 | 255.924 Mrad |
| darker and more accentuated orange | 3490 | 287.3 Mrad |
| various tones of orange | 3490.1 | production process:<br>0↑1000 °F (grey [light beige tone]): 3 g + 25 ml hydrochloric acid / immediate drying on hot plate |
| ↓ | 3490.2 | 0↑1200 °F (chamois): 3 g + 25 ml hydrochloric acid / immediate drying on hot plate |
| ↓ | 3490.3 | 0↑1600 °F (chamois [slightly more orange]): 3 g + 25 ml hydrochloric acid / immediate drying on hot plate |
| ↓ | 3490.4 | 0↑1900 °F (chamois [still lightly more orange]): 3 g + 25 ml hydrochloric acid / immediate drying on hot plate |
| ↓ | 3490.5 | 0↑2300 °F (chamois [orange tone] a bit darker]): 3 g + 25 ml hydrochloric acid / immediate drying on hot plate |
| orange | 3491 | mineral : apatite<br>rock : pale brownish green<br>powder : very light greyish green<br>origin : Black Lake, Thetford county, Québec<br><br>production process:<br>2 g of apatite + 25 ml hydrochloric acid / soaking: 24 h / drying on hot plate[24] |
| | | mineral : beryl<br>rock : intense grass-green, slightly translucid<br>powder : greenish grey<br>origin : unknown<br><br>production process:<br>(followed from «apple-green more accentuated than "very light apple-green"») |

| | | |
|---|---|---|
| orange | 3492 | 3 g of beryl + 40 ml nitric acid / soaking: 1 wk. / separation of the liquid and the solid / natural drying (colour of the solid: very light apple-green[24]) / irradiated with electrons at 305,200 rad[73] |
| orange | 3493 | mineral : calcite[11]<br>powder : white<br>origin : Calcite du Nord Company, Saint-Eugène de Mistassini, Lac Saint-Jean, Québec<br><br>production process:<br>4 g of calcite + 20 ml hydrofluoric acid / soaking: 24 h / drying in drying oven at 100 °F (white [light yellow reflection]): .3 g + 50 cc of transparent polyester resin + 1% of catalyst / manual grinding / moulding / hardening (light grey [very light yellow reflection]) / irradiated with gamma rays at 11.4 Mrad |
| orange | 3494 | production process:<br>4 g of calcite + 25 ml nitric acid / soaking: 24 h / drying on hot plate[24] |
| orange | 3495 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>1.50 g of calcite + .50 g of chrome / 1900 °F / 1 h (grass-green [blue tone] darker than «grass-green [blue tone]»): .25 g + 20 ml ammonia / natural drying |
| orange | 3496 | production process:<br>1.50 g of calcite + .50 g of chrome / 1900 °F / 1 h (grass-green [blue tone] darker than «grass-green [blue tone]»): .25 g + 20 ml nitric acid / soaking: 3 d. / drying on hot plate |
| | | mineral : calcite<br>rock : light pink<br>powder : pinkish white<br>origin : Huddersfield district, Pontiac county, Québec |

| | | |
|---|---|---|
| orange | 3497 | <u>production process:</u><br>4 g of calcite + 20 ml nitric acid / soaking: 3 d. / drying on hot plate[24] |
| orange | 3498 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>(followed from «orange [green tone]»)<br>2 g of iron sulphide - nickel + 2 g of sodium carbonate / 0↑1700 °F + 1 h at 1700 °F<br>(followed at «mixture of particles: orange / green / brown») |
| orange | 3499 | mineral : chalcopyrite<br>powder : dark grey (light green tone)<br>origin : Centre de recherche des Mines Noranda, Montréal, Québec<br><br><u>production process:</u><br>2 g of chalcopyrite + 2 g of sodium carbonate / 0↑1600 °F + 1 h at 1600 °F (mossy chocolate-brown [pink tone]) / irradiated with electrons at 162,431 rad |
| orange | 3500 | mineral : dolomite<br>rock : white (localized yellow reflection), crystalline and translucid<br>powder : white<br>origin : Bristol district, Pontiac county, Québec<br><br><u>production process:</u><br>(followed from «light grey»)<br>2 g of dolomite + 2 g of sodium carbonate / 0↑1500 °F + 1 h at 1500 °F<br>(followed at «orange [green tone]») |
| orange | 3501 | <u>production process:</u><br>2 g of dolomite + 20 ml hydrochloric acid / soaking: 3 d. / drying on hot plate |
| | | mineral : dolomite<br>rock : light grey<br>powder : light grey<br>origin : Shefferville, Ungava, Québec |

621

| | | |
|---|---|---|
| orange | 3502 | production process:<br>2 g of dolomite + 20 ml hydrochloric acid / soaking: 3 d. / drying on hot plate |
| orange | 3503 | mineral : solid epidote<br>rock : brownish green<br>powder : brownish green<br>origin : James Bay, Québec<br><br>production process:<br>0↑1700 °F (dark reddish brown): 1 g + 40 ml hydrochloric acid / soaking: 1 wk. / separation of the liquid and the solid / natural drying (colour of the liquid: vivid yellow[24]) / irradiated with electrons at 164,800 rad<br>(followed at «mixture of particles: pinkish orange / brownish orange») |
| orange | 3504 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml nitric acid / soaking: 3 d. / drying on hot plate[24] |
| orange | 3505 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate[24] |
| 2 areas: 1) orange / yellow; 2) dark green / iron-grey / brown | 3506 | mineral : galena<br>rock : dark grey, with metallic brilliance<br>powder : dark grey, with metallic brilliance<br>origin : Trail, British Columbia<br><br>mineral : cement[1138]<br>powder : white<br><br>production process:<br>(followed from «apple-green / brown [grey tone]»)<br>1 g of powdered galena + 27.40 g of cement + 13 cc of water / manual grinding / moulding / hardening / addition of 3 g of powdered galena at the surface of the piece of dried cement / 0↑1700 °F[476] |

622

| [orange tone] | | |
|---|---|---|
| | | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 15 g<br>powder : light grey<br>origin : East Broughton, Québec<br><br>production process:<br>4 g of powdered galena deposited on a stick of grey steatite: |
| orange | 3507 | 1400 °F / 1 h[280,528] |
| orange ↓ | 3508 | 1500 °F / 1 h[280] |
| orange | 3509 | 1600 °F / 1 h[280,529] |
| | | production process:<br>4 g of powdered galena deposited on a stick of grey steatite: |
| orange / brown | 3510 | 0↑1700 °F[280,527] |
| orange / brown ↓ | 3511 | 0↑1800 °F[280,527] |
| orange / brown | 3512 | 0↑1900 °F[280,527] |
| | | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «dark pinkish beige»)<br>2 g of sandstone + 2 g of sodium carbonate: |
| orange | 3513 | 0↑1400 °F + 1 h at 1400 °F |
| orange | 3514 | 0↑1500 °F + 15 min. at 1500 °F |
| orange | 3515 | 0↑1500 °F + 30 min. at 1500 °F |
| orange (with green particles) | 3516 | 0↑1500 °F + 45 min. at 1500 °F |
| orange (with more green particles) | 3517 | 0↑1500 °F + 1 h at 1500 °F |

623

| | | |
|---|---|---|
| ↓<br>orange (still more green particles) | 3518 | 0↑1600 °F + 1 h at 1600 °F<br><br>(followed at «olive-green») |
| orange | 3519 | mineral : halite[41]<br>rock : colourless<br>powder : colourless<br>origin : Seleine Mine, Iles-de-la-Madeleine, Québec<br><br><u>production process:</u><br>(followed from «brown tint»)<br>rock irradiated with a UV laser beam during 10 min. on a surface of 0.6 $cm^2$ with a laser energy of 0.195 Joule having a flux of 1.1 x $10^7$ W / $cm^2$ to give a total energy of 2,340 Joules |
| orange | 3520 | <u>production process:</u><br>2 g of halite + 20 ml nitric acid / soaking: 3 d. / drying on hot plate (slightly milky white): .3 g + 50 cc of transparent polyester resin + 1% of catalyst / manual grinding / moulding / hardening (very light grey [light yellow reflection]) / irradiated with gamma rays at 5.7 Mrad |
| orange | 3521 | mineral : jade<br>rock : dark red (orange tone)<br>powder : reddish orange<br>origin : China<br><br><u>production process:</u><br>25 g of jade + 100 ml hydrochloric acid / soaking: 5 mo. / natural drying |
| orange | 3522 | <u>production process:</u><br>3 g of jade + 20 ml hydrofluoric acid / soaking: 24 h / drying in a drying oven at 100 °F |
| | | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>2 g of mica + 2 g of sodium carbonate: |

| | | |
|---|---|---|
| opaque orange<br>↓<br>which lightens towards<br>↓<br>orange [almost white] | 3523<br>3524<br>3525<br>3526<br>3527<br>3528 | 0↑1400 °F + 1 h at 1400 °F<br>0↑1500 °F + 1 h at 1500 °F<br>0↑1600 °F + 1 h at 1600 °F<br>0↑1700 °F + 1 h at 1700 °F<br>0↑1800 °F + 1 h at 1800 °F<br>0↑1900 °F + 1 h at 1900 °F |
| orange | 3529 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>0↑1900 °F (mixture of particles: white [yellow reflection] / brown): .40 g + 50 ml hydrochloric acid / soaking: 2 wk. / drying on hot plate[530] |
| orange | 3530 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>2 g of ochre + 2 g of sodium carbonate / 0↑1500 °F + 45 min. at 1500 °F (medium brown [orange tone]) / irradiated with electrons at 162,431 rad |
| orange | 3531 | mineral : ochre[20]<br>powder : orange<br>origin : small copper and nickel deposit, in the South-Western area of a mass of serpentinite at 3 km at the West of Saint-Fabien-de-Panet, Québec<br><br>mineral : nickel<br>powder : dark brownish grey, with metallic brilliance<br><br>production process:<br>1 g of ochre + 1 g of nickel / 2000 °F / 45 min. |
| | | mineral : olivine<br>powder : colourless (green reflection)<br>origin : Mount Haven, United States |

625

| | | |
|---|---|---|
| orange | 3532 | production process:<br>.3 g of olivine + 50 cc of transparent polyester resin + 1% of catalyst / manual grinding / moulding / hardening (light grey [greenish yellow tone]) / irradiated with gamma rays at 5.7 Mrad (followed at «medium yellow ochre [very light green tone]») |
| orange | 3533 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «vivid canary-yellow»)<br>0↑1500 °F (dark pinkish salmon): 3 g + 20 ml hydrochloric acid / soaking: 3 d. / drying on hot plate<br>(followed at «brick-orange») |
| orange | 3534 | production process:<br>10 g of quartz - mica + 100 ml nitric acid / soaking: 1 wk. / drying on hot plate |
| orange | 3535 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>production process:<br>2000 °F / 45 min. |
| orange | 3536 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>mineral : nickel<br>powder : dark brownish grey, with metallic brilliance<br><br>production process:<br>1 g of shale + 1 g of nickel / 2000 °F / 45 min. |
| | | mineral : serandite |

| | | |
|---|---|---|
| orange | 3537 | rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml hydrochloric acid / natural drying (very vivid yellow [orange tone]) / irradiated with electrons at 164,800 rad (followed at «medium rusty orange [brown tone]») |
| orange | 3538 | mineral : spodumene<br>rock : pale green<br>powder : light grey, almost white<br>origin : Québec Lithium Co., Baraute, Abitibi, Québec<br><br>production process:<br>0↑1900 °F (medium brownish grey): .20 g + 50 ml hydrochloric acid / soaking: 2 wk. / drying on hot plate |
| orange | 3539 | mineral : steatite<br>rock : light evergreen<br>powder : white<br>origin : East Broughton, Québec<br><br>production process:<br>(followed from «brown [orange tone] darker than "light brown [orange tone]"»)<br>0↑1700 °F (dark orange [brown tone]): 2 g + 25 ml nitric acid / soaking: 3 d. / drying on hot plate |
| orange | 3540 | mineral : sylvite<br>rock : colourless<br>powder : colourless<br>origin : Strassfurt, Prussia, Germany<br><br>production process:<br>rock irradiated with electrons at 140,400 rad[531,532] |
| orange | 3541 | production process:<br>(followed from «pale orange»)<br>rock irradiated with a UV laser beam during 0.5 min. on a surface of 0.16 $cm^2$ with a laser energy of 0.180 Joule having a flux of 6.5 x $10^6$ W / $cm^2$ which gives a total energy of 54 Joules[533] |

| | | |
|---|---|---|
| orange | 3542 | mineral : fuel oil soot[84]<br>powder : profound brownish black<br>origin : boiler room of Laval University, city of Québec, Québec<br><br><u>production process:</u><br>(followed from «mixture of particles: green / brown [orange tone]»)<br>2 g of soot + 2 g of sodium carbonate / 0↑1700 °F + 1 h at 1700 °F<br>(followed at «mixture of particles: green / orange») |
| orange | 3543 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>(followed from «brown [orange tone]»)<br>0↑1800 °F (pinkish beige [light grey tone], lighter than «pinkish beige [grey tone]»): 5 g + 25 ml hydrochloric acid / soaking: 3 d. / drying on hot plate |
| orange more accentuated than «orange» | 3544 | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>2 g of mica + 2 g of sodium carbonate / 1300 °F / 1 h (yellow [beige tone]) / irradiated with electrons at 162,431 rad |
| orange more acute than «orange» | 3545 | mineral : steatite<br>rock : light evergreen<br>powder : white<br>origin : East Broughton, Québec<br><br><u>production process:</u><br>(followed from «orange [brick-orange type]» and «pale brown»)<br>0↑1700 °F (dark orange [brown tone]): 2 g + 20 ml hydrochloric acid / soaking: 3 d. / drying on hot plate |

| | | |
|---|---|---|
| ↓ orange still more acute ↓ | 3546 | 0↑1800 °F (dark orange [brown tone] more accentuated): 2 g + 20 ml hydrochloric acid / soaking: 3 d. / drying on hot plate |
| orange still more acute | 3546.1 | 0↑1900 °F (darker orange [brown tone] more accentuated): 2 g + 20 ml hydrochloric acid / soaking: 3 d. / drying on hot plate |
| | | mineral : agate<br>rock : grey (with a light orange circular area on the surface), slightly translucid<br>powder : very light grey<br>origin : unknown<br><br>production process:<br>the light orange circular area of the rock is irradiated with gamma rays at: |
| orange a bit more accentuated than «orange» ↓ | 3547 | 5 Mrad |
| orange darker than «orange» ↓ | 3548 | 102.4 Mrad |
| still darker orange | 3549 | 148.4 Mrad<br>(followed at «brown [orange tone]») |
| | | mineral : steatite<br>rock : light cold grey, slightly translucid<br>powder : light grey<br>origin : East Broughton, Québec<br><br>production process:<br>(followed from «greenish yellow») |
| orange more vivid and darker than «orange» | 3550 | 2 g of steatite + 15 ml hydrochloric acid + 10 ml of water / soaking: 3 d. / drying on hot plate (orange more pronounced than «fairly pronounced orange»): .3 g + 50 cc of transparent polyester resin + 1% of catalyst / manual grinding / moulding / hardening (very, very light orange) / irradiated with gamma rays at 34.2 Mrad |
| | | mineral : asbestos[4]<br>rock : dark grey (green reflection)<br>powder : light grey (green reflection)<br>origin : Asbestos Corporation Ltd., Thetford Mines, Québec |

629

| | | |
|---|---|---|
| | | production process:<br>0↑1600 °F (chamois [orange tone]): 3 g + 25 ml hydrochloric acid / soaking: 3 mo. / drying on hot plate (yellow [orange tone]): .3 g + 50 cc of transparent polyester resin + 1% of catalyst / manual grinding / moulding / hardening (light green) / irradiated with gamma rays at: |
| orange | 3551 | 5.7 Mrad |
| ↓ | | |
| darker orange | 3552 | 11.4 Mrad |
| ↓ | | |
| still darker orange | 3553 | 17.1 Mrad |
| ↓ | | |
| more vivid and still darker orange | 3554 | 34.2 Mrad |
| | | mineral : serpentine<br>rock : yellowish green<br>powder : light greenish yellow<br>origin : probably Thetford Mines, Eastern Townships, Québec<br><br>production process:<br>3 g of serpentine + 25 ml hydrochloric acid / soaking: 24 h / drying on hot plate (orange [brown tone]): .5 g + 1 cc of transparent printing ink / manual grinding / 10 superimpositions on white glazed paper (orange) / irradiated with gamma rays at: |
| orange a bit darker than «orange» | 3555 | 11.4 Mrad[89,534] |
| ↓ | | |
| orange very lightly darker than «orange» | 3556 | 17.91 Mrad |
| ↓ | | |
| orange very lightly darker than «orange» | 3557 | 22.8 Mrad |
| | | mineral : peridotite<br>rock : medium grey<br>powder : medium brownish grey (green reflection)<br>origin : Thetford Mines, Québec<br><br>production process:<br>(followed from «sunny yellow darker than "sunny yellow"») |
| orange a bit darker than | 3558 | 4 g of peridotite + 100 ml hydrochloric acid / soaking: 2 wk. / separation of the liquid and the |

630

| | | |
|---|---|---|
| «orange» | | solid / drying on hot plate (colour of the liquid: light lemon-yellow) / irradiated with gamma rays at 424.7 Mrad |
| orange darker than «orange» | 3559 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>2 g of iron sulphide - nickel + 2 g of sodium carbonate / 0↑1600 °F + 1 h at 1600 °F (orange [light green tone]) / irradiated with gamma rays at 64.7 Mrad<br>(followed at «beige [orange tone], between "light beige [orange tone]" and "medium beige [orange tone]"») |
| orange a bit more pale than «medium orange» | 3560 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]) / 1500 °F / 1 h (vivid medium orange [colour of the fruit]) / irradiated with electrons at 302,831 rad[36] |
| orange a bit lighter than «medium orange» | 3561 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br><u>production process:</u><br>4 g of pentlandite + 80 ml nitric acid / soaking: 2 wk. / separation of the liquid and the solid / desiccation (colour of the liquid: medium and vivid orange) / irradiated with gamma rays at 70.4 Mrad[239]<br>(followed at «medium reddish orange [brown reflection]») |
| | | mineral : steatite<br>rock : light evergreen |

| | | |
|---|---|---|
| orange a bit more light and luminous than «medium orange» | 3562 | powder : white<br>origin : East Broughton, Québec<br><br>production process:<br>0↑1500 °F (light brownish grey): 2 g + 20 ml hydrochloric acid / soaking: 3 d. / drying on hot plate (medium orange [green tone]) / irradiated with gamma[239] rays at 64.7 Mrad<br>(followed at «vivid and luminous medium orange») |
| medium orange | 3563 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>(followed from «vivid egg yolk-yellow»)<br>1 g of analcime + 50 ml hydrochloric acid / soaking: 2 wk. / drying on hot plate (light and vivid lemon-yellow) / irradiated with gamma rays at 424.7 Mrad |
| medium orange | 3564 | mineral : bauxite[92]<br>powder : pinkish beige, mat<br>origin : Alcan Company, French Guyana<br><br>production process:<br>0↑1500 °F (pinkish chamois): 3 g + 15 ml hydrochloric acid + 10 ml nitric acid / soaking: 3 d. / drying on hot plate (pinkish rusty orange lighter than «medium pinkish rusty orange»): .3 g + 50 cc of transparent polyester resin + 1% of catalyst / manual grinding / moulding / hardening (light chamois [strong orange tone]) / irradiated with gamma rays at 11.4 Mrad |
| medium orange | 3565 | mineral : fluorescent calcite<br>rock : white (localized grey or brown reflection), translucid<br>powder : white (yellow reflection)<br>origin : Bancroft, Ontario<br><br>production process:<br>.3 g of calcite + 50 cc of transparent polyester resin + 1% of catalyst / manual grinding / moulding / hardening (very light grey [light yellow reflection]) / irradiated with gamma rays at 5.7 Mrad |

| | | |
|---|---|---|
| | | mineral : fluorine<br>rock : white (pinkish reflection), translucid<br>powder : white (grey reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (light beige [brown tone]): .2 g + 50 cc of transparent polyester resin + 1% of catalyst / manual grinding / moulding / hardening / irradiated with gamma rays at 5.7 Mrad |
| medium orange | 3566 | |
| medium orange | 3567 | production process:<br>2 g of fluorine + 20 ml hydrochloric acid / soaking: 3 d. / drying on hot plate (white [very light yellow reflection]): .2 g + 50 cc of transparent polyester resin + 1% of catalyst / manual grinding / moulding / hardening (lemon yellow [light green tone]) / irradiated with gamma rays at 5.7 Mrad |
| medium orange | 3568 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Montréal, Québec<br><br>production process:<br>(followed from «medium pinkish orange»)<br>.50 g of goethite + .50 g of titanium dioxide (whitened rusty orange) / 1700 °F / 1 h |
| medium orange | 3569 | mineral : ochre[98]<br>powder : yellow<br>origin : small copper and nickel deposit, in the South-Western area of a mass of serpentinite at 3 km at the West of Saint-Fabien-de-Panet, Québec<br>production process:<br>20 g of ochre + 100 ml nitric acid / soaking: 1 wk. / drying on hot plate |
| | | mineral : pyrochlore<br>powder : reddish brown<br>origin : De-Mix quarry, North side of Mont Saint-Hilaire, Rouville county, |

| | | |
|---|---|---|
| medium orange | 3570 | Québec<br><br>production process:<br>0↑2000 °F |
| medium orange | 3571 | mineral : sericite shale<br>rock : light grey (green reflection)<br>powder : very, very light grey<br>origin : Magog, Québec<br><br>production process:<br>2 g of shale + 20 ml nitric acid / soaking: 3 d. / drying on hot plate |
| vivid medium orange | 3572 | mineral : beryl<br>rock : intense grass-green, slightly translucid<br>powder : greenish grey<br>origin : unknown<br><br>production process:<br>(followed from «very light beige»)<br>3 g of beryl + 40 ml sulphuric acid / soaking: 18 d. / separation of the liquid and the solid (colour of the solid: very, very light iron-grey [with a few «cobalt-blue particles»]) / irradiated with electrons at 305,200 rad[73] |
| vivid medium orange | 3573 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (very light greyish beige): .2 g + 50 cc of transparent polyester resin + 1% of catalyst / manual grinding / moulding / hardening (very, very light yellow) / irradiated with gamma rays at 5.7 Mrad |
| vivid medium orange | 3574 | mineral : halite[41]<br>rock : colourless<br>powder : colourless<br>origin : Seleine Mine, Iles-de-la-Madeleine, Québec<br><br>production process:<br>2 g of halite + 20 ml sulphuric acid / soaking: 3 d. / drying on hot plate (light beige [light grey tone]): .3 g + 50 cc of transparent polyester re- |

| | | |
|---|---|---|
| | | sin + 1% of catalyst / manual grinding / moulding / hardening (very light grey [light yellow reflection]) / irradiated with gamma rays: 11.4 Mrad |
| | | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>2 g of mica + 2 g of sodium carbonate / 1300 °F / 1 h (yellow [beige tone]) / irradiated with gamma rays at: |
| orange darker and more accentuated than «orange» | 3575 | 64.7 Mrad |
| ↓ | | |
| much more accentuated orange [medium] | 3576 | 424.7 Mrad |
| | | mineral : honey grossular garnet<br>rock : light pinkish beige<br>powder : very light beige<br>origin : Jeffrey Mine, Asbestos (presently J.-M. Asbestos), Québec<br><br>production process:<br>1500 °F / 1 h (very light orange) / rock irradiated with electrons at: |
| orange more accentuated than «very light orange» | 3577 | 164,800 rad |
| ↓ | | |
| medium orange | 3578 | 305,200 rad[73] |
| | | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process: |
| vivid medium orange | 3579 | 4 g of pentlandite + 80 ml nitric acid / soaking: 2 wk. / separation of the liquid and the solid / desiccation / colour of the liquid[350] |

| | | |
|---|---|---|
| vivid and luminous medium orange | 3580 | mineral : steatite<br>rock : light evergreen<br>powder : white<br>origin : East Broughton, Québec<br><br>production process:<br>(followed from «orange a bit lighter and more luminous than "medium orange"»)<br>0↑1500 °F (brownish grey): 2 g + 20 ml hydrochloric acid / soaking: 3 d. / drying on hot plate (medium orange [green tone]) / irradiated with gamma[239] rays at 424.7 Mrad |
| orange a bit darker than «medium orange» | 3581 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>20 g of ochre + 100 ml nitric acid / soaking: 1 wk. / drying on hot plate (medium orange) / irradiated with 64.7 Mrad[239]<br>(followed at «brownish orange») |
| | | mineral : tiger-eye agate<br>rock : orange with silky luster, opaque<br>powder : orange with silky luster<br>origin : Africa<br><br>production process:<br>rock irradiated with gamma[228] rays at: |
| vivid orange | 3582 | 5 Mrad |
| ↓ | | |
| vivid orange | 3583 | 10 Mrad |
| ↓ | | |
| vivid orange | 3584 | 57.4 Mrad |
| ↓ | | |
| vivid orange | 3585 | 64.7 Mrad<br>(followed at «rusty orange») |
| | | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec |

| | | |
|---|---|---|
| vivid orange | 3586 | <u>production process:</u><br>.3 g of apatite + 50 cc of transparent polyester resin + 1% of catalyst / manual grinding / moulding / hardening (very light grey [light yellow reflection]) / irradiated with gamma rays at 11.4 Mrad |
| | | mineral : honey grossular garnet<br>rock : light pinkish beige<br>powder : very light beige<br>origin : Jeffrey Mine, Asbestos (presently J.-M. Asbestos), Québec<br><br><u>production process:</u><br>1500 °F / 1 h (very light orange) / rock irradiated with gamma rays at: |
| orange strongly accentuated<br>↓ | 3587 | 64.7 Mrad |
| orange still more accentuated and a bit darker | 3588 | 424.7 Mrad |
| | | mineral : bauxite[92]<br>powder : pinkish beige, mat<br>origin : Alcan Company, French Guyana<br><br><u>production process:</u><br>(followed from «various tones of yellow [orange tone]») |
| vivid orange | 3589 | 0↑1600 °F (pinkish chamois): 3 g + 25 ml hydrochloric acid / soaking: 3 d. / drying on hot plate (followed at «dark salmon») |
| | | mineral : fluorine<br>rock : violet and white, translucid<br>powder : very light grey<br>origin : Saint-Lawrence Fluorspar Company, Saint-Lawrence, Newfoundland<br><br><u>production process:</u> |
| accentuated orange | 3590 | 2 g of fluorine + 20 ml sulphuric acid / soaking: 3 d. / drying on hot plate (light brown): .2 g + 50 cc of transparent polyester resin + 1% of catalyst / manual grinding / moulding / hardening (greenish yellow) / irradiated with gamma rays at 5.7 Mrad |
| | | mineral : fluorine<br>rock : very light yellow, translucid<br>powder : white (light yellow reflection)<br>origin : Saint-Lawrence Fluorspar Company, Saint-Lawrence, Newfoundland |

| | | |
|---|---|---|
| accentuated orange | 3591 | production process:<br>2 g of fluorine + 20 ml sulphuric acid / soaking: 3 d. / drying on hot plate (very light beige): .2 g + 50 cc of transparent polyester resin + 1% of catalyst / manual grinding / moulding / hardening (light lemon-yellow) / irradiated with gamma rays at 5.7 Mrad |
| vivid orange | 3592 | mineral : halite[41]<br>rock : colourless<br>powder : colourless<br>origin : Seleine Mine, Iles-de-la-Madeleine, Québec<br><br>production process:<br>2 g of halite + 20 ml hydrochloric acid / soaking: 3 d. / drying on hot plate (transparent white [light yellow reflection]): .3 g + 50 cc of transparent polyester resin + 1% of catalyst / manual grinding / moulding / hardening (very, very light grey [light yellow tone]) / irradiated with gamma rays at 11.4 Mrad |
| accentuated orange | 3593 | mineral : olivine<br>powder : colourless (green reflection)<br>origin : Mount Haven, United States<br><br>production process:<br>10 g of olivine + 100 ml hydrochloric acid / soaking: 24 h / drying in drying oven at 130 °C (rusty orange): .4 g + 50 cc of transparent polyester resin + 1% of catalyst / manual grinding / moulding / hardening (medium orange [beige tone]) / irradiated with gamma rays at 11.4 Mrad |
| vivid orange vermilion | 3594 | mineral : industrial pigment[511]<br>powder : vivid reddish orange<br>origin : unknown<br><br>production process:<br>irradiated with electrons at 305,200 rad[73] |
| vivid orange | 3595 | mineral : serpentine<br>rock : yellowish green<br>powder : light greenish yellow<br>origin : probably Thetford Mines, Eastern Townships, Québec<br><br>production process:<br>3 g of serpentine + 25 ml hydrochloric acid / soaking: 24 h / drying on hot plate (orange [brown |

638

| | | |
|---|---|---|
| | | tone]): .3 g + 50 cc of transparent polyester resin + 1% of catalyst / manual grinding / moulding / hardening (light beige [light orange reflection]) / irradiated with gamma rays at 11.4 Mrad |
| vivid orange | 3596 | mineral : obsidian<br>rock : very dark smoky grey, almost black<br>powder : light grey<br>origin : Arkansas, United States<br><br>production process:<br>.3 g of obsidian + 50 cc of transparent polyester resin + 1% of catalyst / manual grinding / moulding / hardening (very light grey [light yellow reflection]) / irradiated with gamma rays at 11.4 Mrad |
| vivid orange | 3597 | mineral : zincite<br>rock : mixture of areas: dark grey / orange-red<br>powder : medium milky chocolate-brown (red tone)<br>origin : Franklin, New Jersey, United States<br><br>production process:<br>0↑1900 °F (black): .40 g + 50 ml sulphuric acid / soaking: 2 wk. / drying on hot plate (white [cream reflection]) / irradiated with electrons at 162,431 rad |
| vivid orange<br>↓<br>lighter vivid orange | 3598<br><br>3599 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>production process:<br>(followed from «olive-green»)<br>0↑1800 °F (brick-orange): 3 g + 25 ml hydrochloric acid / soaking: 4-5 d. / drying on hot plate<br><br>0↑2000 °F (medium brick-orange): 3 g + 25 ml hydrochloric acid / soaking: 4-5 d. / drying on hot plate |
| | | mineral : steatite<br>rock : light cold grey, slightly translucid<br>powder : light grey<br>origin : East Broughton, Québec |

| | | |
|---|---|---|
| pronounced orange | 3600 | <u>production process:</u><br>(followed from «orange [brown tone]»)<br>0†1300 °F (beige [accentuated orange tone]): 2 g + 25 ml hydrochloric acid / soaking: 3 d. / drying on hot plate<br>(followed at «grey [light green tone]») |
| fairly pronounced orange | 3601 | <u>production process:</u><br>2 g of steatite + 5 ml hydrochloric acid + 20 ml of water / soaking: 3 d. / drying on hot plate |
| more pronounced orange | 3602 | 2 g of steatite + 10 ml hydrochloric acid + 15 ml of water / soaking: 3 d. / drying on hot plate |
| still more pronounced orange | 3603 | 2 g of steatite + 15 ml hydrochloric acid + 10 ml of water / soaking: 3 d. / drying on hot plate |
| more pronounced orange | 3604 | 2 g of steatite + 20 ml hydrochloric acid + 5 ml of water / soaking: 3 d. / drying on hot plate |
| ↓<br>still more pronounced orange | 3605 | 2 g of steatite + 25 ml hydrochloric acid / soaking: 3 d. / drying on hot plate |
| | | mineral : calcite<br>rock : light pink<br>powder : pinkish white<br>origin : Huddersfield district, Pontiac county, Québec<br><br><u>production process:</u><br>(followed from «orange-pink [brown tone]»)<br>rock irradiated with gamma rays at: |
| orange darker and more accentuated than «accentuated orange» | 3606 | 102.4 Mrad[536] |
| orange still darker and more accentuated | 3607 | 148.4 Mrad |
| orange still darker and more accentuated | 3608 | 201.6 Mrad |
| darker and more accentuated orange | 3609 | 244.53 Mrad |
| orange equivalent | 3610 | 247.6 Mrad |

640

| | | |
|---|---|---|
| to the previous one<br>↓<br>orange much darker and more accentuated | 3611 | 287.3 Mrad<br><br>(followed at «orange [brown tone]») |
| very vivid orange | 3612 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml nitric acid / soaking: 3 d. / drying on hot plate (medium pink [orange tone]): .2 g + 50 cc of transparent polyester resin + 1% of catalyst / manual grinding / moulding / hardening (grey [light yellow reflection]) / irradiated with gamma rays at 11.4 Mrad |
| orange much more intense and a bit darker than «pronounced orange» | 3613 | mineral : steatite<br>rock : light cold grey, slightly translucid<br>powder : light grey<br>origin : East Broughton, Québec<br><br>production process:<br>20 g of steatite + 100 ml nitric acid / soaking: 5 mo. / natural drying (light orange) / irradiated with gamma[239] rays at 64.7 Mrad<br><br>(followed at «medium burnt orange») |
| darker orange and much more accentuated than «pronounced orange» | 3614 | mineral : asbestos[4]<br>rock : dark grey (green reflection)<br>powder : light grey (green reflection)<br>origin : Asbestos Corporation Ltd., Thetford Mines, Québec<br><br>production process:<br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]) / 1300 °F / 1 h (pronounced orange) / irradiated with gamma rays at 190.22 Mrad<br>(followed at «vivid and luminous egg yolk-yellow [accentuated orange tone]») |
| | | mineral : goethite[106] |

641

| | | |
|---|---|---|
| vivid and dark orange | 3615 | powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Montréal, Québec<br><br>mineral : titanium dioxide<br>powder : white<br>origin : NL Chem Canada Inc., Montréal, Québec<br><br><u>production process:</u><br>(followed from «medium and vivid reddish orange»)<br>1 g of goethite + 1 g of zirconium silicate + 1 g of titanium dioxide / 1700 °F / 1 h |
| orange a bit darker than «dark orange» | 3616 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process:</u><br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): 2 g + 2 g of sulphur / 1500 °F / 1 h (dark chamois [orange tone]) / irradiated with gamma rays at 550.22 Mrad[535] |
| mixture of particles | | |
| light orange / white | 3617 | mineral : analcime<br>rock : white (grey reflection), crystalline and translucid<br>powder : light grey<br>origin : De-Mix quarry, North side of Mont Saint-Hilaire, Rouville county, Québec<br><br><u>production process:</u><br>(followed from «beige darker than "light beige"»)<br>1 g of analcime + 50 ml nitric acid / soaking: 2 wk. / drying on hot plate (light beige) / irradiated with gamma rays at 424.7 Mrad |

642

| | | |
|---|---|---|
| orange / vivid yellow / brownish grey | 3618 | mineral : tiger-eye agate<br>rock : orange with silky luster, opaque<br>powder : orange with silky luster<br>origin : Africa<br><br>production process:<br>(followed from «light yellow [orange tone]»)<br>3 g of agate + 40 ml sulphuric acid / soaking: 18 d. / drying on hot plate (light grey) / irradiated with electrons at 305,200 rad[46] |
| orange / light greenish turquoise | 3619 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «pinkish orange»)<br>50 g of asbestos + 200 ml hydrochloric acid or asbestos entirely covered with hydrochloric acid / soaking: 1 wk. / drying on hot plate (vivid yellow): 3 g + 4 g of sodium carbonate / 0↑1500 °F (followed at «light greenish turquoise») |
| orange / light greenish turquoise | 3620 | production process:<br>(followed from «beige [orange tone]»)<br>50 g of asbestos + 200 ml hydrochloric acid or asbestos entirely covered with hydrochloric acid / soaking: 1 wk. / drying on hot plate (vivid yellow): 3 g + 2 g of sodium carbonate / 0↑1700 °F (followed at «mixture of particles: greenish turquoise / green [emerald-green type]») |
| orange / brown | 3621 | mineral : chalcocite<br>rock : dark iron-grey (with localized turquoise reflection)<br>powder : dark iron-grey<br>origin : Butte, Montana, United States<br><br>production process:<br>(followed from «mixture of particles: beige / brown»)<br>2 g of chalcocite + 2 g of sodium carbonate / 0↑1900 °F + 1 h at 1900 °F[525] |
| | | mineral : chalcopyrite<br>powder : dark grey (light green tone)<br>origin : Centre de recherche des Mines Noranda, Montréal, Québec |

643

| | | |
|---|---|---|
| orange / brown<br>↓<br>orange / brown | 3622<br><br>3623 | production process:<br>(followed from «mixture of particles: brown / orange / grey / green»)<br>2 g of chalcopyrite + 2 g of sodium carbonate:<br>0↑1800 °F + 1 h at 1800 °F<br><br>0↑1900 °F + 1 h at 1900 °F |
| orange / green / brown<br>↓<br>orange / green / brown | 3624<br><br>3625 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «orange»)<br>2 g of iron sulphide - nickel + 2 g of sodium carbonate:<br>0↑1800 °F + 1 h at 1800 °F<br><br>0↑1900 °F + 1 h at 1900 °F |
| orange / brown<br>↓<br>more accentuated orange / more accentuated brown | 3626<br><br>3627 | mineral : magnetite<br>rock : dark grey, with metallic brilliance<br>powder : dark grey<br>origin : Fosse du Labrador, Québec<br><br>production process:<br>(followed from «dark brown [orange tone]»)<br>2 g of magnetite + 2 g of sodium carbonate:<br>0↑1800 °F + 1 h at 1800 °F<br><br>0↑1900 °F + 1 h at 1900 °F |
| orange lighter than «medium orange» / brown | 3628 | production process:<br>0↑1900 °F (dark chocolate-brown): 1 g + 50 ml nitric acid / soaking: 2 wk. / drying on hot plate (mixture of particles: medium orange [brown tone] / blackish grey) / irradiated with electrons at 162,431 rad |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| medium vivid orange / white / medium beige [brown tone] | 3629 | production process:<br>(followed from «light beige [orange tone]»)<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) / irradiated with gamma rays at 614.204 Mrad[726] |
| orange more vivid and luminous than «medium orange [yellow and brown tones]» | 3630 | mineral : clay<br>rock : block: pale greyish green<br>powder : pale greyish green<br>origin : bank of St.-Lawrence river, at the rear of the Miguasha Museum, Gaspésie Québec<br><br>production process:<br>1 g of clay + 50 ml hydrochloric acid / soaking: 2 wk. / drying on hot plate (medium orange [yellow and brown tones]) / irradiated with gamma rays at 424.7 Mrad[81,239] |
| rusty orange | | |
| rusty orange a bit more pale than «whitened rusty orange» | 3631 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Montréal, Québec<br><br>production process:<br>.50 g of goethite + .50 g of zirconium silicate (whitened rusty orange) / irradiated with gamma rays at 602.804 Mrad[239,537] |
| whitened rusty orange | 3632 | production process:<br>.50 g of goethite + .50 g of zirconium silicate / grinding |
| | | mineral : goethite[106]<br>powder : rusty orange<br>origin : Red Mill, in the suburbs of Cap-de-la-Madeleine, Québec |

645

| | | |
|---|---|---|
| whitened rusty orange | 3633 | mineral : titanium dioxide<br>powder : white<br>origin : NL Chem Canada Inc., Montréal, Québec<br><br>production process:<br>.50 g of goethite + .50 g of titanium dioxide / grinding |
| whitened rusty orange | 3634 | production process:<br>.50 g of goethite + .50 g of titanium dioxide (whitened rusty orange) / irradiated with gamma rays at 602.804 Mrad[239,537] |
| rusty orange more pale than «light rusty orange» | 3635 | mineral : olivine<br>powder : colourless (green reflection)<br>origin : Mount Haven, United States<br><br>production process:<br>70 g of olivine + 100 ml nitric acid / soaking: 24 h / drying on hot plate (light and fairly vivid rusty orange) / irradiated with gamma rays at 63.88 Mrad<br>(followed at «fairly vivid red [cochineal red type]») |
| light rusty orange | 3636 | mineral : crocidolite<br>rock : dark greyish blue<br>powder : pale greyish blue<br>origin : Griqualand district, South Africa<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate / formation of 2 superposed layers of colours (layer on the surface: dark green [mint-green type]) / 1000 °F / 1 h<br>(followed at «dark rusty orange») |
| light rusty orange | 3637 | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br>production process:<br>250 g of crocidolite + 1650 ml hydrochloric acid in a 2000 ml becher or crocidolite entirely |

| | | |
|---|---|---|
| | | covered with hydrochloric acid in a vertical container / soaking: 1 wk. / drying on hot plate / formation of 2 superposed layers of colours (layer at the bottom: dark green [light yellow tone]): 2 g + 2 g of sulphur / 1500 °F / 1 h |
| light rusty orange | 3638 | mineral : calcite<br>rock : light pink<br>powder : pinkish white<br>origin : Huddersfield district, Pontiac county, Québec<br><br>production process:<br>0↑1800 °F (medium brownish grey): 2 g + 80 ml nitric acid / soaking: 2 wk. / drying on hot plate (brown [old rose tone]) / irradiated with gamma rays at 70.4 Mrad<br>(followed at «medium brown [orange tone]») |
| light rusty orange | 3639 | production process:<br>0↑1800 °F (medium brownish grey): 2 g + 80 ml nitric acid / soaking: 2 wk. / drying on hot plate (brown [old rose tone]) / irradiated with electrons at 164,800 rad |
| light rusty orange | 3640 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Barraute, Abitibi, Québec<br><br>production process:<br>(followed from «dark orange-red [brown tone]»)<br>0↑1400 °F / slow cooling in furnace (indian red[107]): 1.50 g + 1 g of feldspar (dark reddish brown) / 1600 °F / 1 h<br>(followed at «profound soot-black») |
| light and fairly vivid rusty orange | 3641 | mineral : olivine<br>powder : colourless (green reflection)<br>origin : Mount Haven, United States<br><br>production process:<br>70 g of olivine + 100 ml nitric acid / soaking: 24 h / drying on hot plate |
| | | mineral : silica[91] |

647

| | | |
|---|---|---|
| light and vivid rusty orange | 3642 | powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br><u>production process:</u><br>10 g of silica + 100 ml hydrochloric acid / soaking: 1 wk. / drying on hot plate |
| rusty orange | 3643 | mineral : actinolite<br>rock : cold and light evergreen<br>powder : light grey (light green tone)<br>origin : erratic bloc found at Saint-Philémon, near Dorchester, Québec<br><br><u>production process:</u><br>3 g of actinolite + 50 ml hydrochloric acid / soaking: 2 wk. / separation of the liquid and the solid / drying on hot plate / colour of the liquid[544] |
| | | mineral : tiger-eye agate<br>rock : orange with a silky luster, opaque<br>powder : orange with a silky luster<br>origin : Africa<br><br><u>production process:</u><br>(followed from «vivid orange»)<br>rock irradiated with gamma[228] rays at: |
| rusty orange<br>↓ | 3644 | 102.4 Mrad |
| rusty orange<br>↓ | 3645 | 148.4 Mrad |
| rusty orange | 3646 | 201.6 Mrad<br>(followed at «rusty orange [burnt tone]») |
| 2 areas: rusty orange / white more pure than «chalk-white (grey reflection)» | 3647 | mineral : amethyst<br>rock : light violet, translucid<br>origin : Lac Sairs, Témiscamingue, Québec<br><br><u>production process:</u><br>1600 °F / 1 h (chalk-white [grey reflection]) / rock irradiated with electrons at 305, 200 rad[46] |
| | | mineral : asbestos[4]<br>rock : dark grey (green reflection)<br>powder : light grey (green reflection) |

648

| | | |
|---|---|---|
| | | origin : Asbestos Corporation Ltd., Thetford Mines, Québec<br><br>production process: |
| rusty orange of various intensities | 3648 | 3 g of asbestos + 25 ml nitric acid / soaking: 3 d. / drying on hot plate |
| ↓ | 3649 | 3 g of asbestos + 20 ml nitric acid + 5 ml hydrochloric acid / soaking: 3 d. / drying on hot plate |
| | 3650 | 3 g of asbestos + 15 ml nitric acid + 10 ml hydrochloric acid / soaking: 3 d. / drying on hot plate |
| | 3651 | 3 g of asbestos + 10 ml nitric acid + 15 ml hydrochloric acid / soaking: 3 d. / drying on hot plate |
| | 3652 | 3 g of asbestos + 5 ml nitric acid + 20 ml hydrochloric acid / soaking: 3 d. / drying on hot plate |
| | | mineral : crocidolite<br>rock : dark greyish blue<br>powder : pale greyish blue<br>origin : Griqualand district, South Africa<br><br>production process: |
| rusty orange | 3653 | 2 g of crocidolite + 2 g of sodium carbonate / 1400 °F / 1 h (light brown [orange tone]) / irradiated with electrons at 162,431 rad |
| rusty orange | 3654 | production process:<br>2 g of crocidolite + 2 g of sodium cabonate / 0↑1400 °F + 1 h at 1400 °F (light brown ochre [green reflection]) / irradiated with electrons at 162,431 rad |
| | | mineral : andulusite<br>rock : light brownish grey<br>powder : light grey<br>origin : Bimbowrie, South Australia<br><br>production process: |
| rusty orange | 3655 | 2 g of andulusite + 2 g of sodium carbonate / 0↑1500 °F + 15 min. at 1500 °F (light apple-green) / irradiated with electrons at 162,431 rad |
| | | mineral : anorthosite<br>rock : light grey<br>powder : very, very light greyish beige |

649

| | | |
|---|---|---|
| | | origin : rang Sainte-Germaine, Oka, Québec<br><br>production process:<br>2 g of anorthosite + 20 ml nitric acid / soaking: 3 d. / drying on hot plate |
| rusty orange | 3656 | |
| | | mineral : apophyllite<br>rock : milky white, translucid<br>powder : white<br>origin : Gaspé Copper Mine, Gaspé, Québec<br><br>production process:<br>0↑1800 °F (light grey): .20 g + 50 ml nitric acid / soaking: 2 wk. / drying on hot plate |
| rusty orange | 3657 | |
| rusty orange | 3658 | production process:<br>0↑1800 °F (light grey): .20 g + 50 ml hydrochloric acid / soaking: 2 wk. / drying on hot plate |
| rusty orange | 3659 | mineral : barite<br>rock : pinkish white<br><br>powder : white<br>origin : Niobec Mine, Saint-Honoré, Saguenay, Québec<br><br>production process:<br>0↑1900 °F (greyish beige [pink reflection]): .30 g + 50 ml nitric acid / soaking: 2 wk. / drying on hot plate |
| rusty orange | 3660 | mineral : calcite[11]<br>powder : white<br>origin : Calcite du Nord Company, Saint-Eugène de Mistassini, Lac Saint-Jean, Québec<br><br>production process:<br>(followed at «cream»)<br>1 g of calcite + 1 cc of white transparent synthetic enamel paint used for the car / manual grinding / application on a piece of steel sheet for the car's body measuring 1" x 1" (white) / irradiated with gamma rays at:<br>201.6 Mrad<br><br>(followed at «cream») |
| ↓ | | (followed from «cream») |
| rusty orange | 3661 | 360 Mrad |

| | | |
|---|---|---|
| rusty orange | 3662 | mineral : cerite<br>rock : dark brownish grey<br>powder : light grey (light brown tone)<br>origin : Jamestown, Boulder county, Colorado, United States<br><br>production process:<br>4 g of cerite + 100 ml nitric acid / soaking: 2 wk. / drying on hot plate |
| rusty orange | 3663 | mineral : solid epidote<br>rock : brownish green<br>powder : brownish green<br>origin : James Bay, Québec<br><br>production process:<br>0↑1700 °F (dark reddish brown): 1 g + 40 ml hydrochloric acid / soaking: 1 wk. / separation of the liquid and the solid / natural drying / colour of the solid[79] |
| rusty orange (light red tone) | 3664 | mineral : fluorine<br>rock : colourless<br>powder : colourless<br>origin : unknown<br><br>production process:<br>2 g of fluorine + 25 ml hydrochloric acid / soaking: 24 h / drying on hot plate |
| rusty orange | 3665 | mineral : biotite gneiss<br>rock : blackish grey, golden vitreous brilliance<br>powder : dark grey<br>origin : geological province of Grenville, Québec<br><br>production process:<br>12 g of gneiss + 40 ml nitric acid / soaking: 22 d. / drying on hot plate (dark and vivid reddish orange) / irradiated with electrons at 164,800 rad |
| rusty orange | 3666 | mineral : granite gneiss<br>rock : reddish beige<br>powder : medium pink (light brown tone)<br>origin : Lac Beauport, region of Québec, Québec<br><br>production process:<br>0↑1900 °F (medium beige): 1 g + 50 ml hydrochloric acid / soaking: 2 wk. / drying on hot plate |

| | | |
|---|---|---|
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : zirconium silicate<br>powder : white (very light yellow reflection)<br>origin : Sial Company, Montréal, Québec<br><br>production process:<br>0↑1400 °F / slow cooling in furnace (indian red[107]): 1 g + 1 g of feldspar (dark reddish brown [tends towards Burgundy-red]): .50 g + .50 g of sodium carbonate + .50 g of zirconium silicate / 1700 °F / 1 h (light green) / irradiated with electrons at 164,800 rad |
| rusty orange | 3667 | |
| | | mineral : almandite<br>rock : dark brownish red<br>powder : medium brownish red<br>origin : Gore Mountain, Warren county, New York state, United States<br><br>production process:<br>4 g of almandite + 50 ml sulphuric acid / soaking: 2 wk. / separation of the liquid and the solid / drying on hot plate (colour of the liquid: very, very pale green [almost white]) / irradiated with electrons at 162,431 rad |
| rusty orange | 3668 | |
| rusty orange | 3669 | production process:<br>0↑1900 °F (dark iron-grey): .50 g + 50 ml sulphuric acid / soaking: 2 wk. / drying on hot plate (very light grey [light green tone]) / irradiated with electrons at 162,431 rad |
| rusty orange | 3670 | production process:<br>4 g of almandite + 80 ml hydrochloric acid / soaking: 2 wk. / drying on hot plate (brown [orange tone]) / irradiated with electrons at 162,431 rad |
| | | mineral : sandstone<br>rock : medium pinkish brown (light violet tone)<br>powder : medium pinkish brown (light violet tone)<br>origin : at the back of Percé, Gaspésie, |

652

| | | |
|---|---|---|
| | | Québec |
| rusty orange | 3671 | <u>production process:</u><br>0†1900 °F (medium rusty orange): 2 g + 50 ml nitric acid / soaking: 2 wk. / drying on hot plate |
| rusty orange | 3672 | mineral : jade<br>rock : dark red (orange tone)<br>powder : reddish orange<br>origin : China<br><br><u>production process:</u><br>3 g of jade + 25 ml hydrochloric acid / soaking: 24 h / drying on hot plate |
| rusty orange | 3673 | mineral : magnetite<br>rock : dark grey, with metallic brilliance<br>powder : dark grey<br>origin : Fosse du Labrador, Québec<br><br><u>production process:</u><br>3 g of magnetite + 80 ml hydrochloric acid / soaking: 2 wk. / drying on hot plate (dark brown [orange tone]) / irradiated with electrons at 162,431 rad |
| rusty orange | 3674 | mineral : olivine<br>powder : colourless (green reflection)<br>origin : Mount Haven, United States<br><br><u>production process:</u><br>25 g of olivine + 100 ml hydrochloric acid <u>or</u> olivine entirely covered with 100 ml hydrochloric acid / soaking: 5 mo. / natural drying |
| rusty orange | 3675 | <u>production process:</u><br>10 g of olivine + 100 ml hydrochloric acid / soaking: 24 h / drying in drying oven at 130 °C |
| rusty orange | 3676 | <u>production process:</u><br>2 g of olivine + 20 ml hydrochloric acid / soaking: 2 wk. / irradiated with gamma rays at 5.7 Mrad / drying on sand bath, completed on hot plate |
| | | mineral : uraninite<br>rock : medium chocolate-brown (red Bordeau tone)<br>powder : medium milky chocolate-brown<br>origin : Yellowknife, Canada |

| | | |
|---|---|---|
| rusty orange | 3677 | <u>production process:</u><br>8 g of uraninite + 100 ml hydrochloric acid / soaking: 2 wk. / drying on hot plate (sunny yellow) / irradiated with electrons at 162,431 rad |
| rusty orange | 3678 | mineral : peridotite<br>rock : medium grey<br>powder : medium brownish grey (green reflection)<br>origin : Thetford Mines, Québec<br><br><u>production process:</u><br>4 g of peridotite + 100 ml nitric acid / soaking: 2 wk. / drying on hot plate |
| rusty orange | 3679 | <u>production process:</u><br>0†1900 °F (brown [orange tone]): .20 g + 50 ml hydrochloric acid / soaking: 2 wk. / drying on hot plate |
| rusty orange | 3680 | mineral : pyrrhotite[276]<br>rock : dark greyish brown, with metallic brilliance<br>powder : dark grey<br>origin : Inco Co., Sudbury, Ontario<br><br><u>production process:</u><br>4 g of pyrrhotite + 20 ml sulphuric acid / soaking: 3 d. / drying on hot plate (very light beige [light localized green tone]) / irradiated with electrons at 162,431 rad |
| rusty orange | 3681 | mineral : shale (formation of Sillery[359])<br>rock : brownish red<br>powder : pinkish brown, mat<br>origin : bank of St.-Lawrence riv er at Berthier-Sur-Mer, at the rear of Dénechaud manor, Québec<br><br><u>production process:</u><br>3 g of shale + 25 ml hydrochloric acid / soaking: 3 d. / drying on hot plate (pronounced olive-green) / irradiated with electrons at 162,431 rad |
| rusty orange | 3682 | mineral : clay<br>block : pale greyish green<br>powder : pale greyish green<br>origin : bank of St.-Lawrence river at the rear of the Miguasha Museum, Gaspésie, Québec<br><br><u>production process:</u><br>1 g of clay + 50 ml nitric acid / immediate drying |

| | | |
|---|---|---|
| | | on hot plate (medium rusty orange [tends towards red]) / irradiated with electrons at 162,431 rad |
| rusty orange | 3683 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «light orange»)<br>0↑1200 °F (pinkish beige): 5 g + 25 ml nitric acid / soaking: 3 d. / drying on hot plate (followed at «brown [orange tone]») |
| rusty orange | 3684 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «reddish brown darker than "light reddish brown"»)<br>0↑1600 °F |
| ↓ | | |
| darker and more accentuated rusty orange | 3685 | 0↑1800 °F |
| ↓ | | |
| still darker rusty orange | 3686 | 0↑2000 °F |
| rusty orange (accentuated orange tone) | 3687 | mineral : solid epidote<br>rock : brownish green<br>powder : brownish green<br>origin : James Bay, Québec<br><br>production process:<br>(followed from «medium rusty orange [brown tone]»)<br>12 g of epidote + 40 ml nitric acid / soaking: 14 d. / drying on hot plate (medium rusty brown [orange tone]) / irradiated with gamma rays at 424.7 Mrad |
| | | mineral : cerite<br>rock : dark brownish grey<br>powder : light grey (light brown tone) |

| | | |
|---|---|---|
| rusty orange a bit more luminous [more orange, less brown] than «rusty orange» | 3688 | origin : Jamestown, Boulder county, Colorado, United States<br><br><u>production process:</u><br>4 g of cerite + 100 ml nitric acid / soaking: 2 wk. / drying on hot plate (rusty orange) / irradiated with gamma rays at 424.7 Mrad[81,239] |
| fairly vivid rusty orange | 3689 | mineral : honey grossular garnet<br>rock : light pinkish beige<br>powder : very light beige<br>origin : Jeffrey Mine, Asbestos (presently J.-M. Asbestos), Québec<br><br><u>production process:</u><br>(followed from «pale beige»)<br>1 g of garnet + 1 cc of white transparent synthetic enamel paint used for the car[94] / manual grinding / application on a piece of steel sheet for the car's body measuring 1" x 1" (very pale beige) / irradiated with gamma rays at 102.4 Mrad[351,352]<br>(followed at «beige [orange tone]») |
| rusty orange a bit darker than «rusty orange» | 3690 | mineral : peridotite<br>rock : medium grey<br>powder : medium brownish grey (green reflection)<br>origin : Thetford Mines, Québec<br><br><u>production process:</u><br>4 g of peridotite + 100 ml nitric acid / soaking: 2 wk. / drying on hot plate (rusty orange) / irradiated with electrons at 162,431 rad |
| rusty orange more intense and much darker than «rusty orange» | 3691 | mineral : bauxite[92]<br>powder : pinkish beige, mat<br>origin : Alcan Company, French Guyana<br><br><u>production process:</u><br>2 g of bauxite + 2 g of sodium carbonate / 0↑1500 °F + 55 min. at 1500 °F (orange darker than «orange») / irradiated with gamma rays at 64.7 Mrad<br>(followed at «medium beige [orange-pink tone]») |
| | | mineral : clay<br>block : pale greyish green<br>powder : pale greyish green<br>origin : bank of St.-Lawrence river at the |

| | | |
|---|---|---|
| | | rear of the Miguasha Museum, Gaspésie, Québec |
| rusty orange a bit more pale than «medium rusty orange» | 3692 | <u>production process</u>:<br>1 g of clay + 50 ml nitric acid / immediate drying on hot plate (medium rusty orange [tends towards red]) / irradiated with gamma rays at 64.7 Mrad (followed at «brown [orange tone]») |
| rusty orange lighter and more luminous than «medium rusty orange» | 3693 | mineral : sandstone<br>rock : medium pinkish brown (light violet tone)<br>powder : medium pinkish brown (light violet tone)<br>origin : at the back of Percé, Gaspésie, Québec<br><br><u>production process</u>:<br>4 g of sandstone + 80 ml hydrochloric acid / soaking: 2 wk. / drying on hot plate (medium rusty orange) / irradiated with gamma rays at 64.7 Mrad (followed at «brownish orange») |
| rusty orange a bit lighter than «medium rusty orange» | 3694 | <u>production process</u>:<br>4 g of sandstone + 80 ml hydrochloric acid / soaking: 2 wk. / drying on hot plate (medium rusty orange) / irradiated with electrons at 162,431 rad |
| rusty orange lighter than «medium rusty orange» | 3695 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Montréal, Québec<br><br>mineral : titanium dioxide<br>powder : white<br>origin : NL Chem Canada Inc., Montréal, Québec<br><br><u>production process</u>:<br>1 g of goethite + 1 g of zirconium silicate + 1 g of titanium dioxide / 1600 °F / 1 h (medium and vivid reddish orange): .15 g + 40 ml hydrochloric acid / natural drying (medium and vivid rusty orange) / irradiated with gamma rays at 65.65 Mrad (followed at «dark chocolate-brown») |

657

| | | |
|---|---|---|
| rusty orange lighter than «medium rusty orange» | 3696 | mineral : biotite gneiss<br>rock : blackish grey, golden vitreous brilliance<br>powder : dark grey<br>origin : geological province of Grenville, Québec<br><br>production process:<br>1600 °F / 15 h (medium pink [orange tone], mat): .50 g + 40 ml hydrochloric acid / natural drying (medium rusty orange) / irradiated with gamma rays at 65.65 Mrad<br>(followed at «rusty brown darker than "medium rusty brown"») |
| rusty orange more light, vivid and luminous than «medium rusty orange [the brown tone has disappeared]» | 3697 | mineral : actinolite<br>rock : cold and light evergreen<br>powder : light grey (light green tone)<br>origin : erratic bloc found at Saint-Philémon, near Dorchester, Québec<br><br>production process:<br>0↑1900 °F (light brown [very light orange tone]): 1 g + 50 ml hydrochloric acid / soaking: 2 wk. / drying on hot plate (medium rusty orange [brown tone]) / irradiated with gamma rays at 430.4 Mrad[228,538] |
| medium rusty orange | 3698 | mineral : cerite<br>rock : dark brownish grey<br>powder : light grey (light brown tone)<br>origin : Jamestown, Boulder county, Colorado, United States<br><br>production process:<br>0↑1900 °F (medium brown): .60 g + 50 ml hydrochloric acid / soaking: 2 wk. / drying on hot plate |
| medium rusty orange | 3699 | production process:<br>0↑1900 °F (medium brown): .60 g + 50 ml nitric acid / soaking: 2 wk. / separation of the liquid and the solid / drying on hot plate / colour of the liquid[38] |
| | | mineral : diopside<br>rock : light grey<br>powder : light beige<br>origin : Mont Orford, Québec<br><br>production process:<br>(followed from «grey [beige and green tones]») |

| | | |
|---|---|---|
| medium rusty orange ↓ medium rusty orange | 3700 3701 | powder irradiated with gamma rays at: 424.7 Mrad<br>482.984 Mrad |
| medium rusty orange | 3702 | mineral : clay<br>block : pale greyish green<br>powder : pale greyish green<br>origin : bank of St.-Lawrence river at the rear of the Miguasha Museum, Gaspésie, Québec<br><br>production process:<br>0↑1900 °F (medium brown [orange red tone]): 1 g + 50 ml hydrochloric acid / soaking: 2 wk. / drying on hot plate |
| medium rusty orange | 3703 | mineral : biotite gneiss<br>rock : blackish grey, golden vitreous brilliance<br>powder : dark grey<br>origin : geological province of Grenville, Québec<br><br>production process:<br>1600 °F / 15 h (medium pink [orange tone], mat): .50 g + 40 ml hydrochloric acid / natural drying |
| medium rusty orange | 3704 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>(followed from «orange-red [brown tone], lighter and more orange than "orange-red [brown tone]"»)<br>0↑1400 °F / slow cooling in furnace (indian red[107]): .50 g + 1 g of feldspar (dark reddish brown) / 1600 °F / 1 h<br>(followed at «orange-red a bit lighter than "dark orange-red [brown tone]"») |
| | | mineral : almandite<br>rock : dark brownish red<br>powder : medium brownish red<br>origin : Gore Mountain, Warren county, New York state, United States |

659

| | | |
|---|---|---|
| medium rusty orange | 3705 | production process:<br>4 g of almandite + 80 ml nitric acid / soaking: 1 wk. / drying on hot plate |
| medium rusty orange | 3706 | mineral : sandstone<br>rock : medium pinkish brown (light violet tone)<br>powder : medium pinkish brown (light violet tone)<br>origin : at the back of Percé, Gaspésie, Québec<br><br>production process:<br>4 g of sandstone + 80 ml hydrochloric acid / soaking: 2 wk. / drying on hot plate |
| medium rusty orange | 3707 | mineral : olivine<br>rock : light grey, cristalline<br>powder : very light grey<br>origin : Mont Albert, Gaspésie, Québec<br><br>production process:<br>4 g of olivine + 50 ml nitric acid / soaking: 2 wk. / drying on hot plate |
| medium rusty orange | 3708 | mineral : peridotite<br>rock : medium grey<br>powder : medium brownish grey (green reflection)<br>origin : Thetford Mines, Québec<br><br>production process:<br>4 g of peridotite + 100 ml hydrochloric acid / soaking: 2 wk. / separation of the liquid and the solid / drying on hot plate / colour of the solid[539] |
| medium rusty orange | 3709 | mineral : clay<br>block : pale greyish green<br>powder : pale greyish green<br>origin : bank of St.-Lawrence river at the rear of the Miguasha Museum, Gaspésie, Québec<br><br>production process:<br>1600 °F / 1 h |
| | | mineral : siderite<br>rock : caramel-brown (grey tone)<br>powder : light beige (orange tone)<br>origin : De-Mix quarry, North side of Mont Saint-Hilaire, Rouville county, Québec |

660

| | | |
|---|---|---|
| medium rusty orange ↓ rusty orange more intense and a bit darker | 3710<br>3711 | production process:<br>2 g of siderite + 2 g of sodium carbonate:<br>0↑1300 °F + 1 h at 1300 °F<br>0↑1400 °F + 1 h at 1400 °F<br>(followed at «medium rusty orange [brown tone]») |
| medium and mat rusty orange | 3712 | mineral : smaltite[25], a variety of skutterudite<br>rock : dark iron-grey, with silver metallic brilliance<br>powder : dark grey<br>origin : Cobalt, Ontario<br>production process:<br>0↑1900 °F (dark brown): .30 g + 50 ml hydrochloric acid / soaking: 2 wk. / separation of the liquid and the solid / drying on hot plate (colour of the solid: intense olive-green) / irradiated with electrons at 162,431 rad |
| medium rusty orange | 3713 | production process:<br>3 g of smaltite + 80 ml sulphuric acid / soaking: 2 wk. / separation of the liquid and the solid / drying on hot plate (colour of the solid: light pink) / irradiated with electrons at 162,431 rad |
| medium rusty orange | 3714 | mineral : sphalerite[27]<br>rock : dark grey, golden yellow metallic brilliance<br>powder : dark brownish grey<br>origin : Matagami Mine, Matagami, Québec<br>production process:<br>0↑1800 °F (medium chocolate-brown): 1 g + 50 ml hydrochloric acid / soaking: 2 wk. / drying on hot plate |
| medium rusty orange (with green particles) | 3715 | mineral : vesuvianite<br>rock : lilac<br>powder : lilac<br>origin : John Mansville Mine, Asbestos, Québec<br>production process:<br>0↑900 °F (grey [lilac tone]): .50 g + 40 ml hydrochloric acid / natural drying |
| | | mineral : zincite<br>rock : mixture of areas: dark grey / orange-red |

| | | |
|---|---|---|
| medium rusty orange | 3716 | powder : medium milky chocolate-brown (red tone)<br>origin : Franklin, New Jersey, United States<br><br><u>production process:</u><br>0†1900 °F (black): .40 g + 50 ml hydrochloric acid / soaking: 2 wk. / drying on hot plate |
| medium and vivid rusty orange | 3717 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br><u>production process:</u><br>1 g of goethite + 1 g of titanium dioxide + 1 g of zirconium silicate / 1600 °F / 1 h (medium and vivid reddish orange): .15 g + 40 ml hydrochloric acid / natural drying |
| medium and pronounced rusty orange | 3718 | mineral : peridotite<br>rock : medium grey<br>powder : medium brownish grey (green reflection)<br>origin : Thetford Mines, Québec<br><br><u>production process:</u><br>4 g of peridotite + 100 ml hydrochloric acid / soaking: 2 wk. / separation of the liquid and the solid / drying on hot plate (colour of the solid: medium rusty orange) / irradiated with gamma rays at 64.7 Mrad<br>(followed at «medium greyish chocolate-brown [very light orange tone]») |
| rusty orange much more intense than «medium rusty orange» | 3719 | mineral : olivine<br>rock : light grey, crystalline<br>powder : very light grey<br>origin : Mont Albert, Gaspésie, Québec<br><br><u>production process:</u><br>4 g of olivine + 50 ml nitric acid / soaking: 2 wk. / drying on hot plate (medium rusty orange) / irradiated with gamma rays at 64.7 Mrad<br>(followed at «reddish brown darker than "medium reddish brown"») |

| | | |
|---|---|---|
| rusty orange a bit darker than «medium rusty orange» | 3720 | mineral : crocidolite<br>rock : dark greyish blue<br>powder : pale greyish blue<br>origin : Griqualand district, South Africa<br><br>production process:<br>2 g of crocidolite + 2 g of sodium carbonate / 0↑1200 °F + 1 h at 1200 °F (medium khaki-green [orange-brown tone]) / irradiated with electrons at 162,431 rad |
| rusty orange a bit darker than «medium rusty orange» | 3721 | mineral : goethite[106]<br>powder : rusty orange<br>origin : Red Mill, in the suburbs of Cap-de-la -Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>1 g of goethite + 1 g of zirconium silicate + 1 g of titanium dioxide / 1600 °F / 1 h (medium and vivid reddish orange): .15 g + 40 ml hydrochloric acid / natural drying (medium and vivid rusty orange) / irradiated with electrons at 305,200 rad[46] |
| rusty orange darker than «medium rusty orange» | 3722 | mineral : olivine<br>rock : light grey, crystalline<br>powder : very light grey<br>origin : Mont Albert, Gaspésie, Québec<br><br>production process:<br>4 g of olivine + 50 ml nitric acid / soaking: 2 wk. / drying on hot plate (medium rusty orange) / irradiated with electrons at 162,431 rad |
| rusty orange more | 3723 | mineral : sandstone<br>rock : medium pinkish brown (light violet tone)<br>powder : medium pinkish brown (light violet tone)<br>origin : at the rear of Percé, Gaspésie, Québec<br><br>production process:<br>0↑1900 °F (medium rusty orange): 2 g + 80 ml |

663

| | | |
|---|---|---|
| intense and a bit darker than «medium rusty orange» | | hydrochloric acid / soaking: 2 wk. / drying on hot plate (medium rusty orange [red tone]) / irradiated with gamma rays at 64.7 Mrad (followed at «dark brown [orange tone]») |
| rusty orange more vivid and darker than «medium rusty orange» | 3724 | mineral : sphalerite[27]<br>rock : dark grey, golden yellow metallic brilliance<br>powder : dark brownish grey<br>origin : Matagami Mine, Matagami, Québec<br><br>production process:<br>0↑1800 °F (medium chocolate-brown): 1 g + 50 ml hydrochloric acid / soaking: 2 wk. / drying on hot plate (medium rusty orange) / irradiated with electrons at 164,800 rad |
| rusty orange much darker than «medium rusty orange» | 3725 | mineral : cerite<br>rock : dark brownish grey<br>powder : light grey (light brown tone)<br>origin : Jamestown, Boulder county, Colorado, United States<br><br>production process:<br>0↑1900 °F (medium brown): .60 g + 50 ml nitric acid / soaking: 2 wk. / separation of the liquid and the solid / drying on hot plate (colour of the liquid: medium rusty orange) / irradiated with gamma rays at 64.7 Mrad[239]<br>(followed at «brownish orange») |
| rusty orange much darker than «medium rusty orange» | 3726 | production process:<br>0↑1900 °F (medium brown): .60 g + 50 ml hydrochloric acid / soaking: 2 wk. / separation of the liquid and the solid / drying on hot plate (medium rusty orange) / irradiated with gamma rays at 64.7 Mrad[239]<br>(followed at «brownish orange» |
| rusty orange more pale than «dark rusty orange» | 3727 | mineral : biotite gneiss<br>rock : blackish grey, golden vitreous brilliance<br>powder : dark grey<br>origin : geological province of Grenville, Québec<br><br>production process:<br>(followed from «rusty brown»)<br>12 g of gneiss + 40 ml nitric acid / soaking: 22 d. / drying on hot plate (vivid and dark reddish orange) / irradiated with gamma rays at 423.88 Mrad |
| | | mineral : labrador |

| | | |
|---|---|---|
| | | rock : blackish grey<br>powder : medium grey<br>origin : Lac Saint-Jean, Québec<br><br><u>production process:</u><br>2 g of labrador + 2 g of sodium carbonate / 0↑1300 °F + 1 h at 1300 °F (dark brick rusty orange [red tone]) / irradiated with gamma rays at 423.88 Mrad[239,262] |
| rusty orange lighter than «dark rusty orange» | 3728 | |
| | | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br><u>production process:</u><br>(followed from «dark rusty orange»)<br>250 g of crocidolite + 1650 ml hydrochloric acid in a 2000 ml becher <u>or</u> crocidolite entirely covered with hydrochloric acid in a vertical container / soaking: 1 wk. / drying on hot plate / formation of 2 layers of superposed colours (the layer at the surface is dark green [mint-green type]): 2 g + 24 g of sulphur / 1300 °F / 1 h[540] |
| rusty orange lighter than «dark rusty orange» | 3729 | |
| dark rusty orange | 3730 | <u>production process:</u><br>250 g of crocidolite + 1650 ml hydrochloric acid in a 2000 ml becher <u>or</u> crocidolite entirely covered with hydrochloric acid in a vertical container / soaking: 1 wk. / drying on hot plate / formation of 2 superposed layers of colours (the layer at the surface is dark green [mint-green type]): 2 g + 2 g of sulphur / 1300 °F / 1 h<br>(followed at «medium reddish brown [light violet tone]» and at «rusty orange lighter than "dark rusty orange"») |
| | | mineral : crocidolite<br>rock : dark greyish blue<br>powder : pale greyish blue<br>origin : Griqualand district, South Africa<br><br><u>production process:</u><br>(followed from «brownish chamois»)<br>250 g of crocidolite + 1650 ml hydrochloric acid in a 2000 ml becher <u>or</u> crocidolite entirely |
| dark rusty orange | 3731 | |

| | | |
|---|---|---|
| | | covered with hydrochloric acid in a vertical container / soaking: 1 wk. / drying on hot plate / formation of 2 superposed layers of colours (the layer at the bottom is dark green [light yellow tone]) / 1300 °F / 1 h<br>(followed at «dark rusty orange [red tone]») |
| dark rusty orange | 3732 | production process:<br>(followed from «light rusty orange»)<br>250 g of crocidolite + 1650 ml hydrochloric acid in a 2000 ml becher or crocidolite entirely covered with hydrochloric acid in a vertical container / soaking: 1 wk. / drying on hot plate / formation of 2 superposed layers of colours (the layer at the surface is dark green [mint-green type]) / 1300 °F / 1 h<br>(followed at «Burgundy-pink [brown tone]» and at «dark brownish red») |
| dark rusty orange | 3733 | mineral : chalcopyrite<br>powder : dark grey (light green tone)<br>origin : Centre de recherche des Mines Noranda in Montréal, Québec<br><br>production process:<br>8 g of chalcopyrite + 100 ml nitric acid / natural drying |
| mixture of particles | | |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>(followed from «beige»)<br>2 g of fluorine + 2 g of sodium carbonate: |
| rusty orange / grey ↓ | 3734 | 0↑1700 °F + 1 h at 1700 °F |
| rusty orange / grey ↓ | 3735 | 0↑1800 °F + 1 h at 1800 °F |
| rusty orange / grey | 3736 | 0↑1900 °F + 1 h at 1900 °F |
| | | mineral : asbestos[4]<br>rock : dark grey (green reflection)<br>powder : light grey (green reflection)<br>origin : Asbestos Corporation Ltd., Thetford Mines, Québec |

666

| | | |
|---|---|---|
| mat rusty orange / very pale greenish turquoise (grey tone) | 3738 | <u>production process:</u> 50 g of asbestos + 200 ml hydrochloric acid <u>or</u> asbestos entirely covered with hydrochloric acid / soaking: 1 wk. / drying on hot plate (vivid yellow): 1 g + 3 g of sodium carbonate / 0↑1500 °F (followed at «very, very pale greenish turquoise [grey tone]») |
| [mostly] rusty orange more pale than «medium rusty orange» / white | 3739 | mineral : siderite<br>rock : caramel-brown (grey tone)<br>powder : light beige (orange tone)<br>origin : De-Mix quarry, North side of Mont Saint-Hilaire, Rouville county, Québec<br><br><u>production process:</u> 2 g of siderite + 2 g of sodium carbonate / 0↑1300 °F + 1 h at 1300 °F (medium rusty orange) / irradiated with electrons at 302,831 rad[36] |
| vivid rusty orange / grey (light greenish turquoise tone) | 3740 | mineral : asbestos[4]<br>rock : dark grey (green reflection)<br>powder : light grey (green reflection)<br>origin : Asbestos Corporation Ltd., Thetford Mines, Québec<br><br><u>production process:</u> 50 g of asbestos + 200 ml hydrochloric acid <u>or</u> asbestos entirely covered with hydrochloric acid / soaking: 1 wk. / drying on hot plate (vivid yellow): 2 g + 4 g of sodium carbonate / 0↑1500 °F (followed at «mixture of particles: reddish orange / very light greenish turquoise») |
| rusty orange (green tone) | | |
| rusty orange (green tone) more pale than «medium rusty orange (green tone)» | 3741 | mineral : anorthosite<br>rock : dark grey<br>powder : medium grey<br>origin : Jonquière, Lac Saint-Jean, Québec<br><br><u>production process:</u> 6 g of anorthosite + 50 ml nitric acid / soaking: 2 wk. / drying on hot plate (medium khaki-brown [yellow tone]) / irradiated with electrons at 162,431 rad |
| | | mineral : stibnite |

| | | |
|---|---|---|
| medium rusty orange (green tone) | 3742 | rock : dark grey, with metallic brilliance<br>powder : dark grey, with metallic brilliance<br>origin : Hunan, China<br><br>production process:<br>1400 °F / 2 h and more |
| rusty orange (pink tone) | | |
| light pinkish rusty orange and a bit more beige [less orange] | 3743 | mineral : bauxite[92]<br>powder : pinkish beige, mat<br>origin : Alcan Company, French Guyana<br><br>production process:<br>0↑1500 °F (pinkish chamois): 3 g + 20 ml nitric acid + 5 ml hydrochloric acid / soaking: 3 d. / drying on hot plate (medium and fairly vivid rusty orange [pink tone]) / irradiated with electrons at 302,831 rad[36] |
| medium and fairly vivid pinkish rusty orange<br>↓<br>lighter pinkish rusty orange<br>↓<br>still lighter pinkish rusty orange | 3744<br><br>3745<br><br>3746 | production process:<br>0↑1500 °F (pinkish chamois): 3 g + 20 ml nitric acid + 5 ml hydrochloric acid / soaking: 3 d. / drying on hot plate<br><br>0↑1500 °F (pinkish chamois): 3 g + 15 ml nitric acid + 10 ml hydrochloric acid / soaking: 3 d. / drying on hot plate<br><br>0↑1500 °F (pinkish chamois): 3 g + 10 ml nitric acid + 15 ml hydrochloric acid / soaking: 3 d. / drying on hot plate<br>(followed at «yellow [orange tone]») |
| pinkish rusty orange a bit darker than «medium pinkish rusty orange» | 3747 | production process:<br>0↑1500 °F (pinkish chamois): 3 g + 20 ml nitric acid + 5 ml hydrochloric acid / soaking: 3 d. / drying on hot plate (medium and fairly vivid rusty orange [pink tone]) / irradiated with gamma rays at 64.7 Mrad<br>(followed at «dark salmon [brown tone]») |
| rusty orange (red tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow |

| | | |
|---|---|---|
| | | origin : unknown<br><br>production process:<br>.50 g of goethite + .50 g of sulphur (rusty orange [red tone]) / irradiated with gamma rays at 482.984 Mrad[239,505] |
| reddish rusty orange a bit more pale than «reddish rusty orange» | 3748 | |
| | | mineral : goethite[106]<br>powder : rusty orange<br>origin : Red Mill, in the suburbs of Cap-de-la-Madeleine, Québec<br><br>production process:<br>.50 g of goethite + .50 g of sodium carbonate (rusty orange [red tone]) / irradiated with gamma rays at 360 Mrad[239] |
| reddish rusty orange a bit more pale than «reddish rusty orange» | 3749 | |
| | | mineral : crocidolite<br>rock : dark greyish blue<br>powder : pale greyish blue<br>origin : Griqualand district, South Africa<br><br>production process:<br>(followed from «reddish orange»)<br>2 g of crocidolite + 2 g of sodium carbonate / 0↑1200 °F + 1 h at 1200 °F (medium khaki-green [orange-brown tone]) / irradiated with gamma rays at 550.22 Mrad |
| rusty orange (red tone and more brown) | 3750 | |
| | | mineral : goethite[106]<br>powder : rusty orange<br>origin : Red Mill, in the suburbs of Cap-de-la-Madeleine, Québec<br><br>production process:<br>.50 g of goethite + .50 g of sodium carbonate / grinding |
| reddish rusty orange | 3751 | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown |

| | | |
|---|---|---|
| reddish rusty orange | 3752 | <u>production process:</u><br>.50 g of goethite + .50 g of sulphur / grinding |
| medium rusty orange [tends towards red] | 3753 | mineral : clay<br>block : pale greyish green<br>powder : pale greyish green<br>origin : bank of St.-Lawrence river at the rear of the Miguasha Museum, Gaspésie Québec<br><br><u>production process:</u><br>1 g of clay + 50 ml nitric acid / immediate drying on hot plate |
| medium reddish rusty orange | 3754 | mineral : sandstone<br>rock : medium pinkish brown (light violet tone)<br>powder : medium pinkish brown (light violet tone)<br>origin : at the rear of Percé, Gaspésie, Québec<br><br><u>production process:</u><br>0↑1900 °F (medium rusty brown): 2 g + 80 ml hydrochloric acid / soaking: 2 wk. / drying on hot plate |
| dark reddish rusty orange | 3755 | mineral : crocidolite<br>rock : dark greyish blue<br>powder : pale greyish blue<br>origin : Griqualand district, South Africa<br><br><u>production process:</u><br>(followed from «dark rusty orange»)<br>250 g of crocidolite + 1650 ml hydrochloric acid in a 2000 ml becher <u>or</u> crocidolite entirely covered with hydrochloric acid in a vertical container / soaking: 1 wk. / drying on hot plate / formation of 2 layers of superposed colours (the layer at the bottom is dark green [light yellow tone]) / 1500 °F / 1 h<br>(followed at «light Burgundy-red») |
| dark reddish rusty orange | 3756 | mineral : labrador<br>rock : blackish grey<br>powder : medium grey<br>origin : Lac Saint-Jean, Québec<br><br><u>production process:</u><br>(followed from «beige lighter than "dark beige"»)<br>2 g of labrador + 2 g of sodium carbonate:<br>0↑1300 °F + 1 h at 1300 °F |

| | | |
|---|---|---|
| ↓<br>dark reddish rusty orange | 3757 | 0↑1400 °F + 1 h at 1400 °F<br>(followed at «light green») |
| | | mineral : goethite[106]<br>powder : rusty orange<br>origin : Red Mill, in the suburbs of Cap-de-la-Madeleine, Québec<br><br>production process:<br>(followed from «reddish brown») |
| dark reddish rusty orange<br>↓ | 3758 | 700 °F / 1 h |
| rusty orange (accentuated red tone) | 3759 | 800 °F / 1 h<br><br>(followed at «red [orange tone]») |
| rusty orange (burnt tone) | | |
| | | mineral : tiger-eye agate<br>rock : orange with silky luster, opaque<br>powder : orange with silky luster<br>origin : Africa<br><br>production process:<br>(followed from «rusty orange»)<br>rock irradiated with gamma[228] rays at: |
| burnt rusty orange\|<br>\| | 3760 | 247.6 Mrad |
| burnt rusty orange\|<br>↓ | 3761 | 287.3 Mrad |
| burnt rusty orange | 3762 | 360 Mrad<br>(followed at «orange [brown tone]») |
| rusty orange (brown tone) | | |
| | | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process: |
| rusty orange a bit darker [brown], more intense and | 3763 | 10 g of silica + 100 ml hydrochloric acid / soaking: 1 wk. / drying on hot plate (light and vivid rusty orange) / irradiated with gamma rays at 64.7 Mrad |

| | | |
|---|---|---|
| luminous than «light and vivid rusty orange (brown tone)» | | (followed at «medium orange [brown tone]») |
| rusty orange a bit darker [brown] than «rusty orange (brown tone)» | 3764 | mineral : peridotite<br>rock : medium grey<br>powder : medium brownish grey (green reflection)<br>origin : Thetford Mines, Québec<br>production process:<br>4 g of peridotite + 100 ml nitric acid / soaking: 2 wk. / drying on hot plate (rusty orange) / irradiated with gamma rays at 424.7 Mrad[81] |
| | | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br>production process:<br>1 g of goethite + 1 g of zirconium silicate (whitened rusty orange) / irradiated with gamma rays at: |
| rusty orange | 3765 | 5 Mrad |
| which darkens | 3766 | 10 Mrad |
| ↓ | 3767 | 57.4 Mrad |
| ↓ | 3768 | 102.4 Mrad |
| ↓ | 3769 | 148.4 Mrad |
| ↓ | 3770 | 201.6 Mrad |
| and becomes more brown | 3771 | 247.6 Mrad<br>(followed at «rusty brown») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br>production process:<br>1 g of goethite + 1 g of sulphur (whitened rusty orange) / irradiated with gamma rays at: |
| rusty orange | 3772 | 5 Mrad |
| which accentuates | 3773 | 10 Mrad |

| | | |
|---|---|---|
| itself and darkens a bit (brown tone) ↓ still a bit darker ↓ still more | 3774<br>3775<br>3776<br>3777<br>3778<br><br><br>3779 | 57.4 Mrad<br>102.4 Mrad<br>148.4 Mrad<br>201.6 Mrad<br>247.6 Mrad<br><br><br>287.3 Mrad<br>(followed at «chocolate-brown [light orange reflection]») |
| | | mineral : goethite[106]<br>powder : rusty orange<br>origin : Red Mill, in the suburbs of Cap-de-la-Madeleine, Québec<br><br>production process:<br>powder irradiated with gamma[239] rays at: |
| rusty orange which darkens and becomes more brown ↓ and evolves towards a ↓ darker rusty orange (brown tone) | 3780<br><br>3781<br>3782<br>3783<br>3784<br>3785<br>3786<br>3787<br>3788<br>3789<br>3790<br>3791 | 5 Mrad<br><br>10 Mrad<br>57.4 Mrad<br>65.704 Mrad<br>102.4 Mrad<br>148.4 Mrad<br>201.6 Mrad<br>244.53 Mrad[542]<br>247.6 Mrad<br>287.3 Mrad<br>360 Mrad<br>604.53 Mrad[543] |
| | | mineral : actinolite<br>rock : cold and light evergreen<br>powder : light grey (light green tone)<br>origin : erratic bloc found at Saint-Philémon near Dorchester, Québec<br><br>production process: |
| medium rusty orange (brown tone) | 3792 | 3 g of actinolite + 50 ml nitric acid / soaking: 2 wk. / separation of the liquid and the solid / drying on hot plate / colour of the liquid[544] |
| medium rusty orange (brown tone) | 3793 | production process:<br>0↑1900 °F (light brown [very light orange tone]): 1 g + 50 ml hydrochloric acid / soaking: 2 wk. / drying on hot plate |
| | | mineral : solid epidote<br>rock : brownish green<br>powder : brownish green |

| | | |
|---|---|---|
| medium rusty orange (brown tone) | 3794 | origin : James Bay, Québec<br><br>production process:<br>12 g of epidote + 40 ml nitric acid / soaking: 14 d. / drying on hot plate (medium rusty brown [orange tone]) / irradiated with gamma rays at 64.7 Mrad<br>(followed at «rusty orange [accentuated orange tone]») |
| medium rusty orange (brown tone) | 3795 | mineral : siderite<br>rock : caramel-brown (grey tone)<br>powder : light beige (orange tone)<br>origin : De-Mix quarry, North side of Mont Saint-Hilaire, Rouville county, Québec<br><br>production process:<br>(followed from «rusty orange more intense and darker than "medium rusty orange"»)<br>2 g of siderite + 2 g of sodium carbonate / 0↑1500 °F + 1 h at 1500 °F<br>(followed at «intense grass-green») |
| medium rusty orange (brown tone) | 3796 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>(followed from «orange»)<br>12 g of serandite + 40 ml hydrochloric acid / natural drying (very vivid yellow [orange tone]) / irradiated with electrons at 305,200 rad[73] |
| medium rusty orange (a bit | 3797 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>1 g of goethite + 1 g of titanium dioxide + 1 g of zirconium silicate / 1600 °F / 1 h (medium and |

| | | |
|---|---|---|
| more vivid and brown) | | vivid reddish orange): .15 g + 40 ml nitric acid / natural drying[545] |
| medium rusty orange (brown tone) | 3798 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>4 g of pentlandite + 80 ml hydrochloric acid / soaking: 2 wk. / drying on hot plate |
| medium rusty orange (brown tone) | 3799 | mineral : zincite<br>rock : mixture of areas: dark grey / orange-red<br>powder : medium milky chocolate-brown (red tone)<br>origin : Franklin, New Jersey, United States<br><br>production process:<br>4 g of zincite + 80 ml nitric acid / soaking: 2 wk. / drying on hot plate |
| medium rusty orange (brown tone) | 3800 | mineral : nickeliferous pyrrhotite[23]<br>rock : dark iron-grey, with silver and yellow golden metallic brilliance<br>powder : dark iron-grey<br>origin : Inco Co., Sudbury, Ontario<br><br>production process:<br>4 g of pyrrhotite + 50 ml hydrochloric acid / soaking: 2 wk. / drying on hot plate |
| medium rusty orange (brown tone) | 3801 | mineral : clay<br>block : pale greyish green<br>powder : pale greyish green<br>origin : bank of St.-Lawrence river at the rear of the Miguasha Museum, Gaspésie, Québec<br><br>production process:<br>0↑1900 °F (medium brown [orange-red tone]): 1 g + 50 ml nitric acid / soaking: 2 wk. / immediate drying on hot plate |
| | | production process:<br>0↑1900 °F (medium brown [orange-red tone]): 1 g + 50 ml nitric acid / immediate drying on hot plate / irradiated with gamma rays at: |

| | | |
|---|---|---|
| rusty orange (brown tone) a bit lighter than «pronounced rusty orange (brown tone)» ↓ | 3802 | 64.7 Mrad |
| rusty orange (brown tone) more intense, darker, vivid and luminous | 3803 | 424.7 Mrad |
| brick-orange | | |
| brick-orange | 3804 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>(followed from «orange»)<br>0↑1850 °F (brown [orange-pink tone]): 3 g + 20 ml hydrochloric acid / soaking: 3 d. / drying on hot plate[546]<br>(followed at «brown») |
| orange [brick-orange type] | 3805 | mineral : steatite<br>rock : light evergreen<br>powder : white<br>origin : East Broughton, Québec<br><br><u>production process:</u><br>(followed from «orange [green tone]»)<br>0↑1600 °F (light orange [brown tone]): 2 g + 20 ml hydrochloric acid / soaking: 3 d. / drying on hot plate<br>(followed at «orange more acute than "orange"» and «pale brown») |
| | | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown |

| | | |
|---|---|---|
| medium brick-orange | 3806 | <u>production process:</u><br>2 g of crocidolite + 2 g of sulphur / 1300 °F / 1 h |
| | | mineral : shale (formation of Sillery)[359,547]<br>rock : brownish red<br>powder : pinkish brown, mat<br>origin : bank of St.-Lawrence river, at Berthier-Sur-Mer, at the rear of Dénechaud manor, Québec<br><br><u>production process:</u> |
| brick-orange<br>↓ | 3807 | 0↑1000 °F |
| of various tones<br>↓ | 3808 | 0↑1300 °F |
| which intensifies itself↓ towards<br>↓ | 3809 | 0↑1800 °F |
| medium brick-orange | 3810 | 0↑2000 °F |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u> |
| medium brick-orange↓ | 3811 | 0↑1400 °F / slow cooling in furnace (indian red[107]): .10 g + .50 g of feldspar (dark reddish brown): 1 g + 2 g of sodium carbonate + 1 g of sulphur + 1 g of zirconium silicate + 1 g of titanium dioxide / 1500 °F / 1 h |

| | | |
|---|---|---|
| medium and vivid brick-orange<br>↓ | 3812 | 0↑1400 °F / slow cooling in furnace (indian red[107]): 1.50 g + 1.50 g of feldspar (dark reddish brown): 1 g + 2 g of sodium carbonate + 1 g of sulphur + 1 g of zirconium silicate + 1 g of titanium dioxide / 1500 °F / 1 h |
| brick-orange a bit darker and brown<br>↓ | 3813 | 0↑1400 °F / slow cooling in furnace (indian red[107]): 1 g + 1.50 g of feldspar (medium pinkish orange brown): 1 g + 2 g of sodium carbonate + 1 g of sulphur + 1 g of zirconium silicate + 1 g of titanium dioxide / 1500 °F / 1 h |
| brick-orange still a bit darker and brown<br>↓ | 3814 | 0↑1400 °F / slow cooling in furnace (indian red[107]): .50 g + 1.50 g of feldspar (dark reddish brown): 1 g + 2 g of sodium carbonate + 1 g of sulphur + 1 g of zirconium silicate + 1 g of titanium dioxide / 1500 °F / 1 h |
| brick-orange still a bit darker and brown<br>↓ | 3815 | 0↑1400 °F / slow cooling in furnace (indian red[107]): .25 g + 1.50 g of feldspar (dark reddish brown): 1 g + 2 g of sodium carbonate + 1 g of sulphur + 1 g of zirconium silicate + 1 g of titanium dioxide / 1500 °F / 1 h |
| brick-orange a bit darker and brown | 3816 | 0↑1400 °F / slow cooling in furnace (indian red[107]): .10 g + 1.50 g of feldspar (medium pinkish orange brown): 1 g + 2 g of sodium carbonate + 1 g of sulphur + 1 g of zirconium silicate + 1 g of titanium dioxide / 1500 °F / 1 h |
| | | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br><u>production process:</u><br>2 g of crocidolite + 2 g of sulphur / 1300 °F / 1 h (medium brick-orange) / irradiated with gamma[239] rays at: |
| brick-orange a bit more accentuated than «medium brick-orange»<br>↓ | 3817 | 190.22 Mrad |
| brick-orange a bit more orange | 3818 | 550.22 Mrad |

| | | |
|---|---|---|
| [more luminous], less red and darker [brown] | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec |
| dark brick-orange | 3819 | production process:<br>(followed from «dark orange [brown tone]»)<br>1 g of goethite + 2 g of sodium carbonate + 1 g of sulphur + 1 g of zirconium silicate + 1 g of titanium dioxide / 1500 °F / 1 h |
| burnt orange | | |
| | | mineral : asbestos[4]<br>rock : dark grey (green reflection)<br>powder : light grey (green reflection)<br>origin : Asbestos Corporation Ltd., Thetford Mines, Québec |
| burnt orange | 3820 | production process:<br>rock covered with 20 ml hydrochloric acid / soaking: 2 wk. / irradiated with gamma rays at 5.7 Mrad / drying on sand bath, completed on hot plate |
| | | mineral : almandite<br>rock : dark brownish red<br>powder : medium brownish red<br>origin : Gore Mountain, Warren county, New York state, United States |
| burnt orange (with a few yellow | 3821 | production process:<br>4 g of almandite + 50 ml sulphuric acid / soaking: 2 wk. / separation of the liquid and the solid / drying on hot plate (colour of the solid: grey) / |

679

| | | |
|---|---|---|
| particles) | | irradiated with electrons at 162,431 rad |
| burnt orange | 3822 | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) liquid (2nd) at the surface; b) layer in between: a mixture of the liquid and the solid; c) residual solid at the bottom of the solution / natural drying (colour of the layer in between [mixture of the solid and the liquid]: creamy beige [nearing «beige (brown tone)»] / the layer in between is irradiated with electrons at 162,431 rad |
| medium burnt orange | 3823 | mineral : steatite<br>rock : cold light grey, slightly translucid<br>powder : light grey<br>origin : East Broughton, Québec<br><br>production process:<br>(followed from «orange»)<br>20 g of steatite + 100 ml nitric acid / soaking: 5 mo. / natural drying (light orange) / irradiated with gamma[239] rays at 424.7 Mrad |
| fairly vivid medium burnt orange | 3824 | mineral : halite[41]<br>rock : colourless<br>powder : colourless<br>origin : Selsine Mine, Iles-de-la-Madeleine, Québec<br><br>production process:<br>powder irradiated with neutrons during 2,000 seconds at $10^{12}$ neutrons / $cm^2$ / sec. (the finest particles: bluish grey / the biggest particles: fairly vivid beige [crimson-violet reflection]): 2 g covered with 20 ml of D19 Kodak film developer |
| | | mineral : molybdenite[103]<br>rock : medium grey, with metallic brilliance<br>powder : medium grey, with metallic brilliance<br>origin : Anglo American Molybdenite Mine, near |

680

| | | |
|---|---|---|
| | | Lamotte, Preissiac district, Abitibi, Québec |
| vivid burnt orange | 3824a | production process: 0↑1300 °F + 4 h at 1300 °F (yellow more accentuated than «light yellow»): 1 g is sprinkled on the round end of a pyrex test tube, heated at the state of fusion with an oxyacetylene welding torch / the pigment adheres to it and the entity is immediately brought back to the state of fusion with the torch / immediate cooling in ambient air (very light yellow) / irradiation with gamma rays at 9.88 Mrad |
| burnt orange a bit more pale than «dark burnt orange» | 3824b | mineral : asbestos[4]<br>rock : dark grey (green reflection)<br>powder : light grey (green reflection)<br>origin : Asbestos Corporation Ltd., Thetford Mines, Québec<br><br>mineral : chromite<br>rock : blackish grey<br>powder : medium brownish grey<br>origin : Black Lake, near Thetford Mines, Québec<br><br>production process: 2 g of chromite + 2 g of sodium carbonate / 0↑1900 °F + 1:30 h at 1900 °F (apple-green [yellow tone]). The asbestos is heated 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]). 1 g of «apple-green (yellow tone)» chromite + 1 g of «vivid sunny yellow (light green tone)» asbestos + 0.14061 g of MgO / grinding |
| burnt orange a bit more pale than «dark burnt orange» | 3824c | production process: 2 g of chromite + 2 g of sodium carbonate / 0↑1900 °F + 1:30 h at 1900 °F (apple-green [yellow tone]). The asbestos is heated 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]). 1 g of «apple-green (yellow tone)» chromite + 1 g of «vivid sunny yellow (light green tone)» asbestos + 0.28122 g of potassium carbonate / grinding |

| | | |
|---|---|---|
| dark burnt orange | 3824d | <u>production process:</u><br>2 g of chromite + 2 g of sodium carbonate / 0↑1900 °F + 1:30 h at 1900 °F (apple-green [yellow tone]). The asbestos is heated 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]). 1 g of «apple-green (yellow tone)» chromite + 1 g of «vivid sunny yellow (light green tone)» asbestos / grinding |
| burnt orange (yellow tone) | | |
| burnt orange (yellow tone), with «apple-green areas [at their surface, a fine "greyish brown" layer]» | 3824.1 | mineral : copper<br>rock : reddish brown<br>powder : reddish brown<br>origin : unknown<br><br><u>production process:</u><br>1 g of copper + 5 g of pyrex / grinding / heating: 5 °C per min. 0↑1245 °C + maintenance during 1 h / cooling: 5 °C per min. until ambient temperature is reached / the entity in ambient air |
| burnt orange (yellow tone) a bit more accentuated than «burnt orange (yellow tone)» [a bit more accentuated «apple-green» areas] | 3824.2 | <u>production process:</u><br>1 g of copper + 5 g of pyrex / grinding / heating: 5 °C per min. 0↑1245 °C + maintenance during 1 h / cooling: 5 °C per min. until ambient temperature is reached / the entity in ambient air (burnt orange [yellow tone], with «apple-green areas (at the surface, a fine greyish brown layer)») / irradiated with gamma rays at 9.88 Mrad |
| burnt orange (brown tone) | | |
| burnt orange (brown tone) | 3825 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>2 g of powdered asbestos + 20 ml hydrochloric acid / soaking: 2 wk. / irradiated with gamma rays at 5.7 Mrad / drying on sand bath, completed on hot plate[548] |
| | | mineral : smaltite[25], a variety of skutterudite |

| | | |
|---|---|---|
| burnt orange (brown tone) | 3826 | rock : dark iron-grey, with silver metallic brilliance<br>powder : dark grey<br>origin : Cobalt, Ontario<br><br>production process:<br>0↑1900 °F (dark brown): .30 g + 50 ml hydrochloric acid / soaking: 2 wk. / separation of the liquid and the solid / drying on hot plate (colour of the solid: intense olive-green) / irradiated with gamma rays at 64.7 Mrad[549]<br>(followed at «dark chocolate-brown [localized crimson tone]») |
| caramel-orange | | |
| light caramel-orange ↓ | 3827 | mineral : molten glass<br>rock : transparent white<br><br>production process:<br>(followed from «light orange»)<br>molten glass irradiated with gamma rays at:<br>11.4 Mrad |
| caramel-orange a bit more accentuated | 3828 | 91.29 Mrad<br>(followed at «caramel-orange [brown tone]») |
| caramel-orange ↓ | 3829 | mineral : halite[41]<br>rock : colourless<br>powder : colourless<br>origin : Seleine Mine, Iles-de-la-Madeleine, Québec<br><br>mineral : cement[1138]<br>powder : white<br><br>production process:<br>(followed from «medium caramel-brown [orange tone]»)<br>5 g of rocks of various sizes + 13.74 g of cement + 6.50 cc of water / manual mixing / moulding / hardening / 0↑600 °F / cooling / irradiated with gamma rays at 18.85 Mrad / colour of the rocks |
| caramel-orange (the tone differs from the previous one) | 3830 | 5 g of rocks of various sizes + 13.74 g of cement + 6.50 cc of water / manual mixing / moulding / hardening / 0↑1300 °F / cooling / irradiated with gamma rays at 18.85 Mrad / colour of the rocks |
| | | mineral : iron sulphide - nickel[353] |

| | | |
|---|---|---|
| | | rock : medium greyish green<br>powder : light grey (light green tone)<br>origin : small copper and nickel deposit, in the South-Western area of a mass of serpentinite at 3 km at the West of Saint-Fabien-de-Panet, Québec |
| caramel-orange more intense than «intense caramel-orange» | 3831 | production process:<br>0↑900 °F (grey [light beige tone]): 5 g + 25 ml hydrochloric acid / soaking: 3 d. / drying on hot plate (yellow [light green tone]): .3 g + 50 cc of transparent polyester resin + 1% of catalyst / manual grinding / moulding / hardening (intense caramel-orange) / irradiated with gamma rays at 11.4 Mrad |
| caramel-orange darker than «intense caramel-orange» | 3832 | production process:<br>0↑900 °F (grey [light beige tone]): 5 g + 25 ml hydrochloric acid / soaking: 3 d. / drying on hot plate (yellow [light green tone]): .3 g + 50 cc of transparent polyester resin + 1% of catalyst / manual grinding / moulding / hardening (intense caramel-orange) / irradiated with electrons at:<br>155,082 rad |
| ↓ | | |
| caramel-orange much more accentuated | 3833 | 305,082 rad[354] |
| caramel-orange (green tone) | | |
| | | mineral : galena<br>rock : dark grey, with metallic brilliance<br>powder : dark grey, with metallic brilliance<br>origin : Trail, British Columbia |
| caramel-orange (green reflection) | 3834.1 | production process:<br>the round end of a pyrex test tube is heated with an oxyacetylene welding torch / then, 5 g of galena is sprinkled on the surface at the state of fusion / the galena adheres to it and the entity is immediately brought back to the state of fusion with the torch / immediate cooling in ambient air[1273] |
| caramel-orange (red tone) | | |
| | | mineral : galena<br>rock : dark grey, with metallic brilliance |

| | | |
|---|---|---|
| vivid caramel-orange (red tone) | 3834 | powder : dark grey, with metallic brilliance<br>origin : Trail, British Columbia<br><br><u>production process:</u><br>(followed from «apple-green»)<br>1 g of galena + 1 g of sodium carbonate / grinded and distributed in the porcelain lids used for crucibles / 0↑1500 °F280,550<br>(followed at «medium chocolate-brown [light red tone]») |
| caramel-orange (brown tone) | | |
| caramel-orange (brown tone) | 3835 | mineral : molten glass<br>rock : transparent white<br><br><u>production process:</u><br>(followed from «caramel-orange a bit more accentuated than "light caramel-orange"»)<br>molten glass irradiated with gamma rays at:<br>107.55 Mrad |
| ↓ caramel-orange (brown tone still more accentuated) | 3836 | 118.95 Mrad |
| ↓ caramel-orange (brown tone still a bit more accentuated) | 3837 | 124.65 Mrad550a |
| orange (amber tone) | | |
| orange (amber tone) darker than «orange (amber tone)» | 3838 | mineral : apatite<br>rock : pale brownish green<br>powder : very light greyish green<br>origin : Black Lake, Thetford county, Québec<br><br><u>production process:</u><br>2 g of apatite + 25 ml hydrochloric acid / soaking: 24 h / drying on hot plate (orange) / irradiated with gamma rays at 64.7 Mrad<br>(followed at «mixture of particles: chocolate-brown / milky chocolate-brown») |
| | | mineral : apophyllite<br>rock : milky white, translucid<br>powder : white<br>origin : Gaspé Copper Mine, Gaspé, Québec |

| | | |
|---|---|---|
| medium and intense orange (amber tone) | 3839 | production process:<br>(followed from «light orange»)<br>rock irradiated with gamma rays at 360[551] Mrad<br>(followed at «brown [amber tone]») |
| fairly vivid medium orange [as the fruit] with a very light amber tone | 3840 | mineral : halite[41]<br>rock : colourless<br>powder : colourless<br>origin : Seleine Mine, Iles-de-la-Madeleine, Québec<br><br>production process:<br>rock irradiated with electrons at 162,431 rad (light bluish grey), then at 164,800 rad (light lemon yellow), then at 155,082 rad (yellow ochre), then, during 4 hours with X rays with the help of a therapeutic apparatus, exposed at 448 «shots», each shot having an interval of 30 seconds, during 1/10 of a second, at 100 milliamper and 70 kV at a distance of 40 inches and, afterwards, irradiated with electrons at 140,400 rad |
| orange as the fruit, but intense (light amber tone) | 3841 | production process:<br>rock irradiated with electrons at 162,431 rad (light bluish grey), then at 164,800 rad (light lemon-yellow), then at 155,082 rad (yellow ochre), then at 140,400 rad[552] |
| orange ochre | | |
| medium orange ochre | 3842 | mineral : galena<br>rock : dark grey, with metallic brilliance<br>powder : dark grey, with metallic brilliance<br>origin : Trail, British Columbia<br><br>production process:<br>1 g of powdered galena is deposited on a piece of glass measuring 1" x 1" x 1/8" / 0†1450 °F / slow cooling in furnace[280]<br>(followed at «dark olive-green [orange reflection]») |
| orange (chamois tone) | | |
| orange (light | 3843 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «orange lighter than "light orange"»)<br>0†1900 °F (chamois [orange tone a bit more accen- |

| | | |
|---|---|---|
| chamois tone) | | tuated than «light orange tone»]): 50 g + 200 ml hydrochloric acid or asbestos entirely covered with hydrochloric acid / soaking: 1 wk. / drying on hot plate (vivid yellow) / 1700 °F / 1 h |
| orange (beige tone) | | |
| orange (beige tone), very pale or very pale beige (orange tone) | 3844 | mineral : dolomite<br>rock : white (localized yellow reflection), crystalline and translucid<br>powder : white<br>origin : Bristol district, Pontiac county, Québec<br><br>production process:<br>.3 g of dolomite + 50 cc of transparent polyester resin + 1% of catalyst / manual grinding / moulding / hardening (very, very light greenish grey) / irradiated with gamma rays at 5.7 Mrad |
| very pale orange (beige tone) | 3845 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>(followed from «orange a bit less intense than "very, very light orange"»)<br>2 g of fluorine + 20 ml nitric acid / soaking: 3 d. / drying on hot plate (very, very light orange) / irradiated with electrons at 302,831 rad[45] |
| pale orange (light beige tone) | 3846 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>10 g of silica + 100 ml hydrochloric acid / soaking: 1 wk. / drying on hot plate (light and vivid rusty orange) / irradiated with electrons at 302,831 rad[36] |
| | | mineral : fluorescent calcite<br>rock : white (localized grey or brown |

687

| | | |
|---|---|---|
| | | reflection), translucid<br>powder : white (yellow reflection)<br>origin : Bancroft, Ontario<br><br><u>production process:</u><br>(followed from «light creamy yellow»)<br>powder irradiated with gamma rays at: |
| light and mat orange (beige tone)<br>↓ | 3847 | 424.7 Mrad |
| orange (beige tone) a bit darker | 3848 | 484.704 Mrad |
| light orange (beige tone) | 3849 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>2 g of fluorine + 20 ml nitric acid / soaking: 3 d. / drying on hot plate |
| light orange (light beige tone) | 3850 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>(followed from «light and vivid yellow ochre»)<br>.2 g of fluorine + 50 cc of transparent polyester resin + 1% of catalyst / manual grinding / moulding / hardening (light grey [light yellow reflection]) / irradiated with gamma rays at 11.4 Mrad |
| light orange (beige tone) | 3851 | mineral : olivine<br>powder : Mount Haven, United States<br>origin : colourless (green reflection)<br><br><u>production process:</u><br>(followed from «grey [very, very light brown tone]»)<br>45 g of olivine + 100 ml phosphoric acid / soaking: 3 wk. / drying on hot plate [still humid] (white) / irradiated with gamma rays at 424.7 Mrad[239] |
| | | mineral : orthoclase<br>rock : light pinkish beige<br>powder : very light beige |

589

| | | |
|---|---|---|
| light orange (beige tone) | 3852 | origin : mine near Buckingham, Papineau county, Québec<br><br>production process:<br>(followed from «pinkish orange»)<br>1000 °C / 1 h (very light pinkish beige) / powder irradiated with gamma rays at 424.7 Mrad |
| light orange (beige tone) | 3853 | mineral : antigorite<br>rock : pale yellowish green<br>powder : very pale greenish yellow<br>origin : Canadian Refractories Mine, Kilmar, Québec<br><br>production process:<br>(followed at «light beige [light yellow tone]»)<br>powder irradiated with gamma rays at 424.7 Mrad |
| light orange (beige tone) | 3854 | production process:<br>(followed from «beige a bit more accentuated than "light beige"»)<br>2 g of antigorite + 20 ml sulphuric acid / soaking: 3 d. / drying on hot plate (light beige) / irradiated with gamma rays at 424.7 Mrad |
| light orange (beige tone) | 3855 | production process:<br>(followed from «light beige [orange tone]»)<br>2 g of antigonite + 20 ml hydrochloric acid / soaking: 3 d. / drying on hot plate (light yellow [orange tone]) / irradiated with gamma rays at 424.7 Mrad |
| light orange (light beige tone) | 3856 | mineral : steatite<br>rock : cold light grey, slightly translucid<br>powder : light grey<br>origin : East Broughton, Québec<br><br>production process:<br>0↑1200 °F (grey more accentuated than «light grey»): 2 g + 5 ml hydrochloric acid + 20 ml nitric acid / soaking: 3 d. / drying on hot plate (brown): .3 g + 50 cc of transparent polyester resin + 1% of catalyst / manual grinding / moulding hardening (very, very light yellow) / irradiated with gamma rays at 11.4 Mrad |
| | | mineral : molybdenite[103]<br>rock : medium grey, with metallic brilliance<br>powder : medium grey, with metallic brilliance |

| | | |
|---|---|---|
| | | origin : Anglo American Molybdenite Mine, near Lamotte, Preissiac district, Abitibi, Québec<br><br>production process:<br>(followed from the «colour between "light orange" and "light Naples yellow"») |
| light orange (beige tone)<br>↓ | 3857 | the rock is hermetically wrapped in bread dough / 1600 °F / 30 min. / cooling (blackish grey) / the bread dough is taken off the rock which is heated 0↑1500 °F in ambient air / formation of crystals at the surface of the rock (light Naples yellow): .30 g of crystals + 20 ml nitric acid + 5 ml hydrochloric acid / natural drying / once they have dried, heating on a hot plate / colour of the crystals |
| orange (beige tone) a bit more accentuated than «light orange (beige tone)»<br>↓ | 3858 | the rock is hermetically wrapped in bread dough / 1600 °F / 30 min. / cooling (blackish grey) / the bread dough is taken off the rock which is heated 0↑1500 °F in ambient air / formation of crystals at the surface of the rock (light Naples yellow): .30 g of crystals + 15 ml nitric acid + 10 ml hydrochloric acid / natural drying / once they have dried, heating on a hot plate / colour of the crystals |
| more pale orange (beige tone)<br>↓ | 3859 | the rock is hermetically wrapped in bread dough / 1600 °F / 30 min. / cooling (blackish grey) / the bread dough is taken off the rock which is heated 0↑1500 °F in ambient air / formation of crystals at the surface of the rock (light Naples yellow): .30 g of crystals + 10 ml nitric acid + 15 ml hydrochloric acid / natural drying / once they have dried, heating on a hot plate / colour of the crystals |
| still more pale orange (beige tone) | 3860 | the rock is hermetically wrapped in bread dough / 1600 °F / 30 min. / cooling (blackish grey) / the bread dough is taken off the rock which is heated 0↑1500 °F in ambient air / formation of crystals at the surface of the rock (light Naples yellow): .30 g of crystals + 5 ml nitric acid + 20 ml hydrochloric acid / natural drying / once they have dried, heating on a hot plate / colour of the crystals<br>(followed at «light lemon-yellow») |
| | | mineral : clay<br>block : pale greyish green<br>powder : pale greyish green<br>origin : bank of St.-Lawrence river, at the |

| | | |
|---|---|---|
| | | rear of the Miguasha Museum, Gaspésie, Québec |
| light orange (beige tone) | 3861 | production process:<br>0†1900 °F (medium brown [orange-red tone]): 1 g + 50 ml nitric acid / immediate drying on hot plate / irradiated with electrons at 302,831 rad[36] |
| light and vivid orange (beige tone) | 3862 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate / grinding |
| light and much more intense orange (beige tone) | 3863 | mineral : orthoclase<br>rock : white (grey reflection)<br>powder : white (grey reflection)<br>origin : mine near Buckingham, Papineau county, Québec<br><br>production process:<br>(followed from «beige»)<br>1000 °C / 1 h (very, very light pink [almost white]) / powder irradiated with gamma rays at 424.7 Mrad |
| orange (beige tone) a bit more accentuated than «light orange (beige tone)» | 3864 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) / irradiated with electrons at 164,800 rad |
| | | mineral : bauxite[92]<br>powder : pinkish beige<br>origin : Alcan Company, French Guyana |

691

| | | |
|---|---|---|
| orange (beige tone) | 3865 | <u>production process:</u><br>(followed from «orange [salmon tone]»)<br>2 g of bauxite + 2 g of sodium carbonate / 0↑1500 °F + 20 min. at 1500 °F[554]<br>(followed at «green [between "apple-green" and "Paris green"]») |
| orange (beige tone) or beige (orange tone) | 3866 | mineral : hornblende<br>rock : medium evergreen (light grey tone), with a vitreous brilliance<br>powder : medium cold grey (light green tone)<br>origin : Abitibi, Quebec<br><br><u>production process:</u><br>3 g of hornblende + 20 ml phosphoric acid / soaking: 3 d. / drying on hot plate [still humid] (very light grey): .3 g + 50 cc of transparent polyester resin + 1% of catalyst / manual grinding / moulding / hardening (very light grey) / irradiated with gamma rays at 11.4 Mrad |
| orange (beige tone) or beige (orange tone) | 3867 | mineral : ochre[20]<br>powder : orange<br>origin : small copper and nickel deposit, in the South-Western area of a mass of serpentinite at 3 km at the West of Saint-Fabien-de-Panet, Québec<br><br><u>production process:</u><br>3 g of ochre + 20 ml hydrofluoric acid / soaking: 24 h / drying in oven at 100 °F (light grey): .3 g + 50 cc of transparent polyester resin + 1% of catalyst / manual grinding / moulding / hardening (light grey [light yellow reflection]) / irradiated with gamma rays at 5.7 Mrad |
| orange (beige tone) or beige (orange tone) | 3868 | mineral : olivine<br>origin : Mount Haven, United States<br>powder : colourless (green reflection)<br><br><u>production process:</u><br>30 g of olivine + 100 ml sulphuric acid / soaking: 24 h / drying on hot plate (light cream [light orange tone]): .3 g + 50 cc of transparent polyester resin + 1% of catalyst / manual grinding / moulding / hardening (light grey [light yellow reflection]) / irradiated with gamma rays at 5.7 Mrad |
| | | mineral : ochre[111] |

692

| | | |
|---|---|---|
| orange (beige tone) | 3869 | powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «beige [orange tone]»)<br>1 g of ochre + 1 g of zirconium silicate + 1 g of titanium dioxide / 0↑1750 °F / slow cooling in furnace[555] |
| orange (beige tone) | 3870 | mineral : steatite<br>rock : cold light grey, slightly translucid<br>powder : light grey<br>origin : East Broughton, Québec<br><br>production process:<br>15 g of steatite + 100 ml sulphuric acid / soaking: 24 h / drying on hot plate |
| orange (beige tone) or beige (orange tone) | 3871 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>powder finely grinded and heated 0↑1200 °F (Naples yellow): .50 g + 15 ml nitric acid / soaking: 2 d. / drying on hot plate (yellow [light green tone]): .2 g + 50 cc of transparent polyester resin + 1% of catalyst / manual grinding / moulding / hardening (light grey) / irradiated with gamma rays at 5.7 Mrad |
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec |

| | | |
|---|---|---|
| orange (beige tone) | 3872 | production process:<br>1 g of yofortierite + 50 ml sulphuric acid / soaking: 2 wk. / separation of the liquid and the solid / drying on hot plate (colour of the liquid: intense blue) / irradiated with electrons at 162,431 rad |
| | | mineral : asbestos[4]<br>rock : dark grey (green reflection)<br>powder : light grey (green reflection)<br>origin : Asbestos Corporation Ltd., Thetford Mines, Québec<br><br>production process:<br>0↑2100 °F (chamois [orange tone]) / irradiated with gamma rays at: |
| orange (beige tone) ↓ | 3873 | 254.20 Mrad |
| medium orange (beige tone) | 3874 | 614.20 Mrad |
| | | mineral : sulphur<br>rock : brilliant yellow<br>powder : brilliant yellow<br>origin : unknown<br><br>production process:<br>(followed from «Naples yellow more pale than "very light Naples yellow"») |
| orange (beige tone [between «light orange (beige tone)» and «medium orange (beige tone)»] | 3875 | .50 g of sulphur + .50 g of sodium carbonate (very light yellow [Naples yellow type]) / irradiated with gamma rays at 424.7 Mrad |
| | | mineral : biotite gneiss<br>rock : blackish grey, golden vitreous brilliance<br>powder : dark grey<br>origin : Grenville geological province, Québec<br><br>production process:<br>(followed at «light orange») |
| medium orange (beige tone) | 3876 | 12 g of gneiss + 40 ml sulphuric acid / soaking: 22 d. / drying on hot plate (mixture of particles: white / light beige) / irradiated with electrons at 305,200 rad[73] |
| | | mineral : haematite<br>rock : medium chocolate-brown<br>powder : medium chocolate-brown |

| | | |
|---|---|---|
| medium and mat orange (beige tone) or medium and mat beige (orange tone) | 3877 | origin : Nouveau Québec, Québec<br><br>production process:<br>0↑1800 °F (dark brown [violet tone]): 4 g + 100 ml sulphuric acid / soaking: 4 years / drying on hot plate |
| medium orange (light beige tone) | 3878 | mineral : siderite<br>rock : caramel-brown (grey tone)<br>powder : light beige (orange tone)<br>origin : De-Mix quarry, North side of Mont Saint-Hilaire, Rouville county, Québec<br><br>production process:<br>(followed from «beige [orange tone]»)<br>powder irradiated with gamma rays at 424.7 Mrad |
| medium orange (beige tone) | 3879 | mineral : ochre[111]<br>powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «light beige [salmon tone]»)<br>1 g of ochre + 1 g of zirconium silicate + 1 g of titanium dioxide / 0↑1650 °F<br>(followed at «beige [orange tone]») |
| medium orange (beige tone) or medium beige (orange tone) | 3880 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «beige-flesh [salmon tone]»)<br>1 g of ochre + 1 g of titanium dioxide / 0↑600 °F / slow cooling in furnace |

| | | |
|---|---|---|
| more vivid medium orange (beige tone) ↓ | 3881 | 1 g of ochre + 1 g of titanium dioxide / 0↑1650 °F / slow cooling in furnace |
| still more vivid orange (beige tone) [more orange] ↓ | 3882 | 1 g of ochre + 1 g of titanium dioxide / 0↑1700 °F / slow cooling in furnace |
| still more vivid orange (beige tone [more orange] | 3883 | 1 g of ochre + 1 g of titanium dioxide / 0↑1750 °F / slow cooling in furnace |
| medium orange (beige tone) | 3884 | mineral : antigorite<br>rock : pale yellowish green<br>powder : very pale greenish yellow<br>origin : Canadian Refractories Mine, Kilmar, Québec<br><br>production process:<br>(followed from «beige [orange tone] darker than "light beige [orange tone]"»)<br>1000 °C / 1 h (light chamois [orange tone]) / powder irradiated with gamma rays at 424.7 Mrad |
| medium orange (beige tone) | 3885 | mineral : obsidian<br>rock : very dark smoky grey, almost black<br>powder : light grey<br>origin : Arkansas, United States<br>production process:<br>2 g of obs idian + 20 ml sulphuric acid / soaking: 3 d. / drying on hot plate (medium greyish brown): .3 g + 50 cc of transparent polyester resin + 1% of catalyst / manual grinding / moulding / hardening (very light lemon-yellow) / irradiated with gamma rays at 5.7 Mrad |
| orange (beige tone) more accentuated than «medium orange (beige tone)» | 3886 | mineral : olivine<br>origin : Mount Haven, United States<br>powder : colourless (green reflection)<br><br>production process:<br>(followed from «brown [orange tone]»)<br>10 g of olivine + 100 ml hydrochloric acid / soaking: 24 h / drying in oven at 130 °C (rusty orange): .4 g + 50 cc of transparent polyester resin + 1% of catalyst / manual grinding / moulding / hardening (medium orange [beige tone]) / irradiated with electrons at 305,082 rad[354] |
| orange (brown tone) | | |

| | | |
|---|---|---|
| pale orange (brown tone) | 3887 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «brown [orange tone]»)<br>2 g of ochre + 1 g of titanium dioxide / 0↑1750 °F / slow cooling in furnace |
| orange (brown tone) a bit more pale than «light orange (brown tone)» | 3889 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>5 g of asbestos + 100 ml sulphuric acid / soaking: 2 wk. / drying on hot plate (almost pure white [light yellow reflection]): 2 g + 2 g of sulphur / 1300 °F / 1 h (light orange [brown tone more brown than without sulphur]) / irradiated with electrons at 302,831 rad[36] |
| light orange (brown tone) [more brown than without sulphur] | 3890 | production process:<br>5 g of asbestos + 100 ml sulphuric acid / soaking: 2 wk. / drying on hot plate (almost pure white [light yellow reflection]): 2 g + 2 g of sulphur / 1300 °F / 1 h |
| light orange (brown tone) | 3891 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «medium chamois [orange tone]»)<br>50 g of asbestos + 200 ml hydrochloric acid or asbestos entirely covered with hydrochloric acid / soaking: 1 wk. / drying on hot plate (vivid yellow): 3 g + 1 g of sodium carbonate / 0↑1700 °F (followed at «medium orange [brown tone]») |

| | | |
|---|---|---|
| light brownish orange | 3892 | mineral : tremolite<br>rock : medium brown (evergreen tone)<br>powder : greyish beige<br>origin : Tetreault mine, Montauban, Portneuf county, Québec<br>production process:<br>(followed from «light brownish orange»)<br>6 g of tremolite + 50 ml hydrochloric acid / soaking: 2 wk. / drying on hot plate (medium and vivid lemon-yellow) / irradiated with gamma[239] rays at 64.7 Mrad<br>(followed at «medium brownish orange [green tone]») |
| | | mineral : steatite<br>rock : light evergreen<br>powder : white<br>origin : East Broughton, Québec<br>production process:<br>(followed from «light brownish grey») |
| light brownish orange! | 3893 | 0↑1600 °F |
| light brownish orange! | 3894 | 0↑1650 °F |
| dark brownish orange which | 3895 | 0↑1700 °F |
| ↓ accentuates itself | 3896 | 0↑1800 °F |
| ↓ still more | 3897 | 0↑1900 °F<br>(followed at «light brown») |
| orange a bit more intense and brown than «light brownish orange» | 3898 | production process:<br>30 g of steatite + 100 ml nitric acid / soaking: 1 wk. / drying on hot plate (light orange [less orange than when soaked during 5 mo.]) / irradiated with electrons at 302,831 rad[36] |
| orange a bit darker [brown] than «light brownish orange» | 3899 | production process:<br>30 g of steatite + 100 ml nitric acid / soaking: 1 wk. / drying on hot plate (light orange [less orange than when soaked during 5 mo.]) / irradiated with gamma rays at 64.7 Mrad<br>(followed at «medium brownish orange») |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| brownish orange a bit darker than «very light brownish orange» | 3900 | production process:<br>3 g of asbestos + 25 ml hydrochloric acid / soaking: 5 d. / drying in oven at 100 °F (yellow-orange tone): .5 g + 1 cc of white transparent printing ink / manual grinding / 1 impression on white glazed paper (very light and mat brownish orange) / irradiated with gamma rays at 22.8 Mrad[556] |
| brownish orange [with dark brown streaks] | 3900.1 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>1 g of galena + 1 g of sulphur + 6.50 g of powdered glass (spruce pine batch) / manual grinding / deposited on a ceramic plate at the state of biscuit / heated in a furnace 0†1000 °C in normal atmosphere / slow cooling in furnace (areas: apple-green / caramel-orange [yellow reflection]) / irradiated with gamma rays at 9.88 Mrad |
| brownish orange | 3901 | mineral : tiger-eye agate<br>rock : orange with silky luster, opaque<br>powder : orange with silky luster<br>origin : Africa<br><br>production process:<br>(followed from «burnt rusty orange»)<br>rock irradiated with gamma[228] rays at 424.7 Mrad |
| brownish orange | 3902 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid <u>or</u> asbestos entirely covered with hydrochloric acid / soaking: 1 wk. / drying on hot plate (vivid yellow): 3 g + 4 g of sodium carbonate / 1800 °F / 15 min.<br>(followed at «orange [greenish brown tone]») |

| | | |
|---|---|---|
| brownish orange | 3903 | mineral : bauxite[92]<br>powder : pinkish beige<br>origin : Alcan Company, French Guyana<br><br>production process:<br>(followed from «beige»)<br>0↑1925 °F (flesh): 3 g + 25 ml hydrochloric acid / soaking: 3 d. / drying on hot plate |
| brownish orange<br>↓<br>brownish orange | 3904<br><br>3905 | mineral : fluorescent calcite<br>rock : white (localized grey or brown reflection), translucid<br>powder : white (yellow reflection)<br>origin : Bancroft, Ontario<br><br>production process:<br>(followed from «orange-yellow [light brown tone]»)<br>rock irradiated with ramma rays at:<br>424.7 Mrad<br><br>425.704 Mrad[559]<br>(followed at «brown [orange tone]») |
| brownish orange | 3906 | mineral : solid epidote<br>rock : brownish green<br>powder : brownish green<br>origin : James Bay, Québec<br><br>production process:<br>(followed from «light yellow [orange tone]»)<br>12 g of epidote + 40 ml hydrochloric acid / soaking: 14 d. / separation of the liquid and the solid / natural drying (colour of the liquid: vivid yolk-yellow) / irradiated with electrons at 305,200 rad[73] |
| orange [as the fruit] (brown tone) | 3907 | mineral : halite[41]<br>rock : colourless<br>powder : colourless<br>origin : Seleine Mine, Iles-de-la-Madeleine, Québec<br><br>production process:<br>rock irradiated with electrons at 162,431 rad (light grey [light blue tone]), then with X rays with the help of a therapeutic apparatus during 4 hours, with 448 «shots» at an interval of 30 seconds during 1/10 of a second at 100 milliamper and 70 kV at a distance of 40 inches, then with electrons at 140,400 rad |

700

| | | |
|---|---|---|
| orange (light brown tone) | 3908 | mineral : hypersthene<br>rock : black<br>powder : medium brownish grey<br>origin : Lac Saint-Jean, Québec<br><br><u>production process:</u><br>2 g of hypersthene + 2 g of sodium carbonate / 0↑1500 °F + 1 h at 1500 °F<br>(followed at «dark brown») |
| brownish orange | 3909 | mineral : microcline<br>rock : white (grey reflection)<br>powder : white (grey reflection)<br>origin : Buckingham, Québec<br><br><u>production process:</u><br>(followed from «orange much more accentuated than "light orange"»)<br>0↑1900 °F (light grey): .50 g + 50 ml hydrochloric acid / soaking: 2 wk. / drying on hot plate (light orange [same colour as the fruit]) / irradiated with gamma rays at 424.7 Mrad |
| orange (light brown tone) | 3910 | mineral : ochre[98]<br>powder : yellow<br>origin : small copper and nickel deposit, in the South-Western area of a mass of serpentinite at 3 km at the West of Saint-Fabien-de-Panet, Québec<br><br><u>production process:</u><br>35 g of ochre + 100 ml hydrochloric acid / soaking: 5 mo. / natural drying |
| brownish orange<br>↓<br>brownish orange | 3911<br><br>3912 | <u>production process:</u><br>(followed from «brown [orange tone]»)<br>2 g of ochre + 2 g of sodium carbonate:<br>0↑1800 °F + 1 h at 1800 °F<br><br>0↑1900 °F + 1 h at 1900 °F |
| brownish orange | 3913 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>0↑500 °F (cream a bit darker than «light cream»): |

| | | |
|---|---|---|
| | | 3 g + 20 ml hydrochloric acid / soaking: 3 d. / drying on hot plate (followed at «vivid canary-yellow») |
| brownish orange | 3915 | mineral : serpentine<br>rock : yellowish green<br>powder : light greenish yellow<br>origin : probably Thetford Mines, Eastern Townships, Québec<br><br>production process:<br>3 g of serpentine + 25 ml hydrochloric acid / soaking: 24 h / drying on hot plate |
| brownish orange | 3916 | mineral : antigorite<br>rock : pale yellowish green<br>powder : very pale greenish yellow<br>origin : Canadian Refractories Mine, Kilmar, Québec<br><br>production process:<br>2 g of antigorite + 20 ml nitric acid / soaking: 3 d. / drying on hot plate |
| brownish orange | 3917 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>2 g of silica + 20 ml hydrochloric acid / soaking: 2 wk. / irradiated with gamma rays at 11.4 Mrad / drying on sand bath, completed on hot plate |
| brownish orange | 3918 | mineral : steatite<br>rock : light cold grey, slightly translucid<br>powder : light grey<br>origin : East Broughton, Québec<br><br>production process:<br>30 g of steatite + 100 ml hydrochloric acid / soaking: 1 wk. / drying on hot plate |

| | | |
|---|---|---|
| | | production process:<br>(followed from «light orange») |
| brownish orange | 3919 | 0↑1250 °F (grey more accentuated than «light grey»): 2 g + 25 ml hydrochloric acid / soaking: 3 d. / drying on hot plate |
| pronounced brownish orange | 3920 | 0↑1300 °F (grey [light brown tone]): 2 g + 25 ml hydrochloric acid / soaking: 3 d. / drying on hot plate<br>(followed at «grey [light green tone]»)<br>(followed from «brownish grey») |
| brownish orange lighter than the one obtained at 1250 °F | 3921 | 0↑1700 °F (beige [light orange tone]): 2 g + 25 ml hydrochloric acid / soaking: 3 d. / drying on hot plate |
| brownish orange (orange aspect more accentuated) | 3922 | 0↑1800 °F (beige [accentuated orange tone]): 2 g + 25 ml hydrochloric acid / soaking: 3 d. / drying on hot plate |
| ↓ more pronounced brownish orange | 3923 | 0↑1900 °F (beige [orange tone still more accentuated]): 2 g + 25 ml hydrochloric acid / soaking: 3 d. / drying on hot plate |
| | | mineral : steatite<br>rock : light evergreen<br>powder : white<br>origin : East Broughton, Québec<br>production process: |
| orange (light brown tone) | 3924 | 0↑1200 °F(light grey [light brown tone]): 2 g + 20 ml hydrochloric acid / soaking: 3 d. / drying on hot plate |
| brownish orange | 3925 | 0↑1300 °F (light grey [brown tone more accentuated]): 2 g + 20 ml hydrochloric acid / soaking: 3 d. / drying on hot plate |
| ↓ orange (more accentuated brown tone) | 3926 | 0↑1400 °F (light grey [brown tone still more accentuated]): 2 g + 20 ml hydrochloric acid / soaking: 3 d. / drying on hot plate<br>(followed at «orange [green tone]») |
| | | mineral : calcite<br>rock : light pink<br>powder : pinkish white<br>origin : Huddersfield district, Pontiac county, Québec<br>production process:<br>(followed from «orange») |

| | | |
|---|---|---|
| | | rock irradiated with gamma rays at: |
| brownish orange darker than «brownish orange» | 3927 | 360 Mrad |
| ↓ | | |
| brownish orange still more brown | 3928 | 424.7 Mrad |
| ↓ | | |
| brownish orange still more brown | 3929 | 604.53 Mrad |
| | | mineral : serandite<br>rock : white<br>powder : white<br>origin : De-Mix quarry, North side of Mont Saint-Hilaire, Rouville county, Québec<br><br>production process:<br>(followed from «orange more vivid than "very light orange"»)<br>rock irradiated with gamma rays at: |
| brownish orange a bit darker than brownish orange | 3930 | 247.6 Mrad |
| ↓ | | |
| brownish orange a bit darker than brownish orange | 3931 | 287.3 Mrad |
| ↓ | | |
| brownish orange darker and more brown | 3932 | 360 Mrad<br><br>(followed at «light milky chocolate-brown») |
| | | mineral : sandstone<br>rock : medium pinkish brown (light violet tone)<br>powder : medium pinkish brown (light violet tone)<br>origin : at the rear of Percé, Gaspésie, Québec<br><br>production process:<br>2 g of sandstone + 2 g of sodium carbonate / 0↑1500 °F + 1 h at 1500 °F (orange [with green particles]) / irradiated with gamma rays at: |
| orange much more accentuated and a bit darker [brown] than «brownish orange» | 3933 | 64.7 Mrad |
| ↓ | | |
| darker brownish orange [between | 3934 | 424.7 Mrad |

| | | |
|---|---|---|
| «medium brownish orange» and «dark brownish orange»] | | |
| medium brownish orange | 3935 | <u>production process</u>:<br>2 g of sandstone + 2 g of sodium carbonate / 0↑1500 ºF + 1 h at 1500 ºF (orange [with green particles]) / irradiated with electrons at 162,431 rad[561] |
| medium brownish orange | 3936 | mineral : asbestos[4]<br>rock : dark grey (green reflection)<br>powder : light grey (green reflection)<br>origin : Asbestos Corporation Ltd., Thetford Mines, Québec<br><br><u>production process</u>:<br>(followed from «light orange [brown tone]»)<br>50 g of asbestos + 200 ml hydrochloric acid <u>or</u> asbestos entirely covered with hydrochloric acid / soaking: 1 wk. / drying on hot plate (vivid yellow): 3 g + 1 g of sodium carbonate / 0↑1800 ºF (followed at «dark orange [brown tone]») |
| medium brownish orange | 3937 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process</u>:<br>(followed from «orange»)<br>5 g of asbestos + 80 ml nitric acid / soaking: 2 wk. / drying on hot plate (dark brown [orange tone]): 2 g + 1 g of sulphur / 1300 ºF / 1 h[562] |
| | | mineral : analcime<br>rock : white (grey reflection), crystalline and translucid<br>powder : light grey<br>origin : De-Mix quarry, North side of Mont Saint-Hilaire, Rouville county, Québec<br><u>production process</u>:<br>(followed from «light beige») |

| | | |
|---|---|---|
| medium brownish orange | 3938 | 1 g of analcime + 50 ml sulphuric acid / soaking: 2 wk. / drying on hot plate (white) / irradiated with gamma[239] rays at 424.7 Mrad |
| medium and intense brownish orange | 3939 | mineral : apophyllite<br>rock : milky white, translucid<br>powder : white<br>origin : Gaspé Copper Mine, Gaspé, Québec<br><br>production process:<br>1 g of apophyllite + 60 ml nitric acid / soaking: 2 wk. / drying on hot plate (light orange) / irradiated with gamma[81] rays at 424.7 Mrad |
| medium brownish orange | 3940 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «light apple-green [localized yellow reflection]»)<br>.45 g of galena powder + .45 g of sulphur / deposited on a piece of glass measuring 1" x 1" x 1/8" / 0↑1600 °F / slow cooling in furnace[280]<br>(followed at «yellowish orange [localized green reflection]») |
| brownish orange which is vivid and more accentuated than «medium brownish orange» | 3941 | mineral : clay<br>block : pale greyish green<br>powder : pale greyish green<br>origin : bank of St.-Lawrence river, at the rear of the Miguasha Museum, Gaspésie Québec<br><br>mineral : sulphur<br>rock : brilliant yellow<br>powder : brilliant yellow<br>origin : unknown<br><br>production process:<br>2 g of clay + 2 g of sulphur / 1300 °F / 1 h (vivid and medium orange [brown tone]) / irradiated with gamma rays at 64.7 Mrad<br><br>(followed at «brownish orange [light yellow tone]») |

| | | |
|---|---|---|
| medium and vivid brownish orange | 3942 | production process:<br>2 g of clay + 2 g of sulphur / 1300 °F / 1 h |
| medium brownish orange | 3943 | mineral : biotite gneiss<br>rock : blackish grey, golden vitreous brilliance<br>powder : dark grey<br>origin : Geological province of Grenville, Québec<br><br>production process:<br>(followed from «beige [orange tone]»)<br>1600 °F / 15 h (medium pink [orange tone], mat): .50 g + 40 ml hydrochloric acid / natural drying (medium rusty orange) / irradiated with electrons at 305,200 rad[73] |
| medium brownish orange | 3944 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>0↑1400 °F / slow cooling in furnace (indian red[107]): 1.50 g + 1.50 g of feldspar (dark reddish brown): .50 g + .50 g of sulphur + .50 g of titanium dioxide + .50 g of zirconium silicate / 1600 °F / 1 h<br>(followed at «dark chocolate-brown [grey tone]» and «dark orange [brick-red tone]») |
| | | mineral : goethite[106]<br>powder : rusty orange<br>origin : Red Mill, in the suburbs of Cap-de-la-Madeleine, Québec |

| | | |
|---|---|---|
| medium brownish orange | 3945 | mineral : feldspar<br>rock : white, opaque<br>powder : white<br>origin : Barraute, Abitibi, Québec<br><br><u>production process:</u><br>(followed from «orange-red [brown tone] a bit less dark than "dark orange-red [brown tone]"»)<br>0↑1400 °F / slow cooling in furnace (indian red[107]): 1 g + 1 g of feldspar (dark reddish brown [tends towards Burgundy-red]) / 1600 °F / 1 h (followed at «dark orange-red» and at «dark orange-red [brown tone]») |
| medium brownish orange | 3946 | mineral : uraninite<br>rock : medium chocolate-brown (red Bordeau tone)<br>powder : medium milky chocolate-brown<br>origin : Yellowknife, Canada<br><br><u>production process:</u><br>8 g of uraninite + 100 ml sulphuric acid / soaking: 2 wk. / drying on hot plate (grey [light green tone]) / irradiated with electrons at 162,431 rad |
| medium brownish orange | 3947 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>we connect the tube, conducting the $COCO_2$, on the furnace / 0↑1300 °F + 1 h at 1300 °F with gas / slow cooling in furnace in the presence of gas / sweeping with the neutral gas (oxygen: 10.1%; balance: argon) or with air |
| | | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br><u>production process:</u><br>(followed from «rusty orange») |

| | | |
|---|---|---|
| medium brownish orange | 3948 | 10 g of silica + 100 ml hydrochloric acid / soaking: 1 wk. / drying on hot plate (light and vivid rusty orange) / irradiated with gamma rays at 424.7 Mrad |
| medium brownish orange | 3949 | mineral : steatite<br>rock : light cold grey, slightly translucid<br>powder : light grey<br>origin : East Broughton, Québec<br><br>production process:<br>(followed from «orange a bit darker [brown] than "light brownish orange"»)<br>30 g of steatite + 100 ml nitric acid / soaking: 1 wk. / drying on hot plate (light orange [less orange than when soaking lasts 5 mo.]) / irradiated with gamma rays at 424.7 Mrad |
| brownish orange more pronounced than «medium brownish orange» | 3950 | mineral : olivine<br>powder : colourless (green reflection)<br>origin : Mount Haven, United States<br><br>production process:<br>70 g of olivine + 100 ml nitric acid / soaking: 24 h / drying on hot plate (light and fairly vivid rusty orange): .3 g + 50 cc of transparent polyester resin + 1% of catalyst / manual grinding / moulding / hardening (medium orange [light brown reflection]) / irradiated with gamma rays at 5.7 Mrad |
| orange (brown reflection) more pronounced than «medium brownish orange» | 3951 | production process:<br>(followed from «light brown»)<br>70 g of olivine + 100 ml nitric acid / soaking: 24 h / drying on hot plate (light and fairly vivid rusty orange): .3 g + 50 cc of transparent polyester resin + 1% of catalyst / manual grinding / moulding / hardening (medium orange [light brown reflection]) / irradiated with electrons at 305,082 rad[354] |
| orange a bit darker [brown] than «medium brownish | 3952 | mineral : asbestos[4]<br>rock : dark grey (green reflection)<br>powder : light grey (green reflection)<br>origin : Asbestos Corporation Ltd., Thetford Mines, Québec<br><br>production process:<br>0↑1900 °F (chamois [orange tone a bit more accentuated than «light orange tone»]): 50 g + 200 ml hydrochloric acid or asbestos entirely covered |

| | | |
|---|---|---|
| orange» | | with hydrochloric acid / soaking: 1 wk. / drying on hot plate (vivid sunny yellow [light green tone]) / 1500 °F / 1 h (medium vivid orange [colour of the fruit]) / irradiated with gamma rays at 550.22 Mrad[535] |
| orange darker [brown] than «medium brownish orange» | 3953 | mineral : cerite<br>rock : dark brownish grey<br>powder : light grey (light brown tone)<br>origin : Jamestown, Boulder county, Colorado, United States<br><br>production process:<br>(followed from «rusty orange much darker than "medium rusty orange"»)<br>0↑1900 °F (medium brown): .60 g + 50 ml nitric acid / soaking: 2 wk. / separation of the liquid and the solid / drying on hot plate (colour of the liquid: medium rusty orange) / irradiated with gamma rays at 424.7 Mrad[239] |
| orange darker [brown] than «medium brownish orange» | 3954 | production process:<br>(followed from «rusty orange much darker than "medium rusty orange"»)<br>0↑1900 °F (medium brown): .60 g + 50 ml hydrochloric acid / soaking: 2 wk. / drying on hot plate (medium rusty orange) / irradiated with gamma rays at 424.7 Mrad |
| orange a bit darker [brown] than «medium brownish orange» | 3955 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «rusty orange»)<br>4 g of sandstone + 80 ml hydrochloric acid / soaking: 2 wk. / drying on hot plate (medium rusty orange) / irradiated with gamma rays at 424.7 Mrad |
| brownish orange more vivid [between «medium | 3956 | mineral : magnetite<br>rock : dark grey, with metallic brilliance<br>powder : dark grey<br>origin : Fosse du Labrador, Québec<br><br>production process:<br>(followed from «brown [orange tone]»)<br>3 g of magnetite + 80 ml hydrochloric acid / soaking: 2 wk. / drying on hot plate (dark brown [orange tone]) / irradiated with gamma rays at |

710

| | | |
|---|---|---|
| brownish orange» and «dark brownish orange»] | | 430.4 Mrad |
| brownish orange [between «medium brownish orange» and «dark brownish orange»] | 3957 | mineral : steatite<br>rock : light evergreen<br>powder : white<br>origin : East Broughton, Québec<br>production process:<br>0↑2200 °F (light brown): 2 g + 80 ml hydrochloric acid / soaking: 2 wk. / drying on hot plate (chocolate brown) / irradiated with gamma rays at 70.4 Mrad<br>(followed at «blackish chocolate-brown [localized rusty orange reflection]») |
| orange a bit darker [brown] than «medium brownish orange» | 3958 | mineral : ochre[98]<br>powder : yellow<br>origin : small copper and nickel deposit, in the South-Western area of a mass of serpentinite at 3 km at the West of Saint-Fabien-de-Panet, Québec<br>production process:<br>(followed from «orange a bit darker than "medium orange"»)<br>20 g of ochre + 100 ml nitric acid / soaking: 1 wk. / drying on hot plate (medium orange) / irradiated with gamma rays at 424.7 Mrad |
| brownish orange more pale than «dark brownish orange» | 3959 | mineral : asbestos[4]<br>rock : dark grey (green reflection)<br>powder : light grey (green reflection)<br>origin : Asbestos Corporation Ltd., Thetford Mines, Québec<br>mineral : sulphur<br>rock : brilliant yellow<br>powder : brilliant yellow<br>origin : unknown<br>production process:<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 2 g + 2 g of sulphur / 1500 °F / 1 h (dark chamois [orange tone]) / irradiated with electrons at 302,831 rad[36] |

| | | |
|---|---|---|
| dark brownish orange | 3960 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «dark beige [orange tone]»)<br>1 g of goethite + 1 g of sodium carbonate + 1 g of sulphur + 1 g of zirconium silicate + 1 g of titanium dioxide / 1500 °F / 1 h<br>(followed at «dark brick-orange») |
| dark brownish orange | 3961 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>1 g of goethite + 1 g of sulphur + 1 g of titanium dioxide / 1500 °F / 1 h<br>(followed at «medium brownish grey [violet reflection]») |
| dark brownish | 3962 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «medium brownish orange»)<br>50 g of asbestos + 200 ml hydrochloric acid or |

| | | |
|---|---|---|
| orange<br>↓<br>dark brownish orange | 3963 | asbestos entirely covered with hydrochloric acid / soaking: 1 wk. / drying on hot plate (vivid yellow): 3 g + 1 g of sodium carbonate / 0↑1900 °F<br><br>50 g of asbestos + 200 ml hydrochloric acid <u>or</u> asbestos entirely covered with hydrochloric acid / soaking: 1 wk. / drying on hot plate (vivid yellow): 3 g + 1 g of sodium carbonate / 0↑2000 °F |
| brownish orange much more intense and a bit darker [brown] than «dark brownish orange» | 3964 | mineral : steatite<br>rock : light evergreen<br>powder : white<br>origin : East Broughton, Québec<br><u>production process:</u><br>0↑1700 °F (dark brownish orange) / irradiated with gamma rays at 64.7 Mrad |
| mixture of particles | | |
| brownish orange / pinkish orange / cream | 3965 | mineral : solid epidote<br>rock : brownish green<br>powder : brownish green<br>origin : James Bay, Québec<br><br><u>production process:</u><br>(followed from «orange»)<br>0↑1700 °F (dark reddish brown): 1 g + 40 ml hydrochloric acid / soaking: 1 wk. / separation of the liquid and the solid / natural drying (colour of the liquid: vivid yellow[24]) / irradiated with electrons at 305,200 rad[73] |
| medium brownish orange / blackish grey | 3966 | mineral : magnetite<br>rock : dark grey, with metallic brilliance<br>powder : dark grey<br>origin : Fosse du Labrador, Québec<br><br><u>production process:</u><br>0↑1900 °F (dark chocolate-brown): 1 g + 50 ml nitric acid / soaking: 2 wk. / drying on hot plate |
| brownish orange (green tone) | | |
| | | mineral : asbestos[4]<br>rock : dark grey (green reflection) |

| | | |
|---|---|---|
| | | powder : light grey (green reflection)<br>origin : Asbestos Corporation Ltd., Thetford Mines, Québec<br><br>production process:<br>(followed from «brownish orange»)<br>50 g of asbestos + 200 ml hydrochloric acid or asbestos entirely covered with hydrochloric acid / soaking: 1 wk. / drying on hot plate (vivid yellow): 3 g + 4 g of sodium carbonate / 1800 °F / 30 min.<br>(followed at «khaki-green») |
| brownish orange (acquires a green tone, which gives it an «olive-green» appearance) | 3967 | |
| | | mineral : beryl<br>rock : intense grass-green, slightly translucid<br>powder : greenish grey<br>origin : unknown<br><br>production process:<br>3 g of beryl + 40 ml hydrochloric acid / soaking: 1 wk. / separation of the liquid and the solid / natural drying (colour of the liquid: vivid olive-green) / irradiated with gamma rays at 64.7 Mrad<br>(followed at «mixture of particles: brown / grey») |
| brownish orange (very light green tone) | 3968 | |
| | | mineral : tremolite<br>rock : medium brown (evergreen tone)<br>powder : greyish beige<br>origin : Tetreault mine, Montauban, Portneuf county, Québec<br>production process:<br>(followed from «light brownish orange»)<br>6 g of tremolite + 50 ml hydrochloric acid / soaking: 2 wk. / drying on hot plate (medium and vivid lemon-yellow) / irradiated with gamma[239] rays at 424.7 Mrad |
| medium brownish orange (green tone) | 3969 | |
| brownish orange (yellow tone) | | |
| | | mineral : clay<br>block : pale greyish green<br>powder : pale greyish green<br>origin : bank of St.-Lawrence river, at the rear of the Miguasha Museum, Gaspésie, Québec<br><br>mineral : sulphur<br>rock : brilliant yellow<br>powder : brilliant yellow<br>origin : unknown |

714

| | | |
|---|---|---|
| brownish orange (light yellow tone), more pale than «medium and vivid brownish orange (yellow tone), [less brown and red]» | 3970 | <u>production process:</u><br>(followed from «medium and vivid brownish orange»)<br>2 g of clay + 2 g of sulphur / 1300 °F / 1 h (medium and vivid brownish orange) / irradiated with gamma rays at 424.7 Mrad |
| brownish orange (pink tone) | | |
| brownish orange (light pink reflection) | 3971 | mineral : almandite<br>rock : dark brownish red<br>powder : medium brownish red<br>origin : Gore Mountain, Warren county, New York state, United States<br><br><u>production process:</u><br>0↑1900 °F (dark iron-grey): .20 g + 50 ml phosphoric acid / soaking: 4 years / drying on hot plate (still humid) |
| brownish orange (red tone) | | |
| brownish orange (red tone)<br>↓ | 3972 | mineral : crocidolite<br>rock : dark greyish blue<br>powder : pale greyish blue<br>origin : Griqualand district, South Africa<br><br><u>production process:</u><br>0↑1300 °F[557,558] |
| brownish orange (red tone) still more orange | 3973 | 0↑1600 °F<br><br>(followed at «reddish orange») |
| darker brownish orange (light red tone) | 3974 | mineral : ochre[20]<br>powder : orange<br>origin : small copper and nickel deposit, in the South-Western area of a mass of serpentinite at 3 km at the West of Saint-Fabien-de-Panet, Québec<br><br><u>production process:</u><br>we connect the tube conducting the COCO$_2$ to furnace 0↑1300 °F / sweeping with neutral gas (oxygen: 10.1%; balance: argon) or with air / immediate removal |

ORANGE (PINK TONE)

| colour obtained | number | mineral / production process |
|---|---|---|
| orange (salmon tone) | | |
| orange (salmon tone) | 3975 | mineral : bauxite[92]<br>powder : pinkish beige, mat<br>origin : Alcan Company, French Guyana<br><br><u>production process:</u><br>(followed from «yellow ochre darker than "yellow ochre"»)<br>2 g of bauxite + 2 g of sodium carbonate / 0↑1500 °F + 10 min. at 1500 °F<br>(followed at «orange [beige tone]») |
| dark orange (salmon tone) [orange tone predominates] | 3976 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process:</u><br>5 g of asbestos + 100 ml sulphuric acid / soaking: 2 wk. / drying on hot plate (almost pure white [light yellow reflection]): 2 g + 2 g of sulphur / 1300 °F / 1 h (light orange [brown tone more brown than with sulphur]) / irradiated with gamma rays at 190.22 Mrad[563]<br>(followed at «medium milky chocolate-brown [light pink tone]») |
| orange (pink tone) or pinkish orange | | |
| | | mineral : galena<br>rock : dark grey, with metallic brilliance<br>powder : dark grey, with metallic brilliance<br>origin : Trail, British Columbia<br><br>mineral : shale (formation of Sillery[359])<br>rock : brownish red |

| | | |
|---|---|---|
| | | powder : pinkish brown, mat<br>origin : bank of St.-Lawrence river at Berthier-Sur-Mer, the rear of the Dénechaud manor, Québec<br><br>mineral : cement[1138]<br>powder : white |
| light pinkish orange / yellow (orange tone) / light pink (orange tone) | 3977 | production process:<br>27.40 g of cement + 13 ml water + 5 g of shale integrated to the mass of cement / manual grinding / moulding / hardening / addition at the surface of the piece of dried cement of 3 g of galena / 0↑1700 °F[507,564,567]<br>(followed at «apple-green» [graphite], at «apple-green / yellowish orange » [bauxite[92]], at «green / brown» [goethite[106]], at «dark green / brown (orange tone) / iron-grey / yellow / orange» [asbestos[4]]) |
| | | mineral : asbestos[4]<br>rock : dark grey (green reflection)<br>powder : light grey (green reflection)<br>origin : Asbestos Corporation Ltd., Thetford Mines, Québec |
| light pinkish orange ↓ | 3978 | production process:<br>50 g of asbestos + 200 ml hydrochloric acid or asbestos entirely covered with hydrochloric acid / soaking: 1 wk. / drying on hot plate (vivid yellow): 3 g + 2 g of sodium carbonate / 0↑1200 °F |
| darker and more brown pinkish orange ↓ | 3979 | 50 g of asbestos + 200 ml hydrochloric acid or asbestos entirely covered with hydrochloric acid / soaking: 1 wk. / drying on hot plate (vivid yellow): 3 g + 2 g of sodium carbonate / 0↑1300 °F |
| pinkish orange a bit more orange, less dark and more accentuated | 3980 | 50 g of asbestos + 200 ml hydrochloric acid or asbestos entirely covered with hydrochloric acid / soaking: 1 wk. / drying on hot plate (vivid yellow): 3 g + 2 g of sodium carbonate / 0↑1400 °F (followed at «beige [orange-pink tone]») |
| light pinkish orange ↓ | 3981 | production process:<br>50 g of asbestos + 200 ml hydrochloric acid or asbestos entirely covered with hydrochloric acid / soaking: 1 wk. / drying on hot plate (vivid yellow): 3 g + 4 g of sodium carbonate / 0↑1200 °F |
| darker and more | 3982 | 50 g of asbestos + 200 ml hydrochloric acid or |

| | | |
|---|---|---|
| accentuated pinkish orange<br>↓<br>orange (light pink tone) darker and more accentuated | 3983 | asbestos entirely covered with hydrochloric acid / soaking: 1 wk. / drying on hot plate (vivid yellow): 3 g + 4 g of sodium carbonate / 0↑1300 °F<br><br>50 g of asbestos + 200 ml hydrochloric acid <u>or</u> asbestos entirely covered with hydrochloric acid / soaking: 1 wk. / drying on hot plate (vivid yellow): 3 g + 4 g of sodium carbonate / 0↑1400 °F (followed at «mixture of particles: orange / greenish turquoise») |
| pinkish orange lighter than «pinkish orange» | 3984 | <u>production process:</u><br>3 g of asbestos + 5 ml nitric acid + 20 ml hydrochloric acid / soaking: 3 d. / drying on hot plate (rusty orange) / irradiated with gamma rays at 190.22 Mrad<br>(followed at «dark milky chocolate-brown») |
| orange (pinkish and beige tones) | 3985 | mineral : granite gneiss<br>rock : reddish beige<br>powder : medium pink (light brown tone)<br>origin : Lac Beauport, region of the city of Québec, Québec<br><br><u>production process:</u><br>(followed from «orange-pink [beige tone]»)<br>powder irradiated with gamma rays at 360 Mrad<br>(followed at «light beige [orange tone and pink reflection]») |
| pinkish orange | 3986 | mineral : orthoclase<br>rock : light pinkish beige<br>powder : very light beige<br>origin : mine near Buckingham, Papineau county, Québec<br><br><u>production process:</u><br>1000 °C / 1 h (very light pinkish beige) / powder irradiated with gamma rays at 64.7 Mrad<br>(followed at «light orange [beige tone]») |
| orange (pinkish and beige tones) [between «light | 3987 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>(followed from «white [pink reflection]»)<br>1000 °C / 1 h (white [light pink reflection]) / powder irradiated with gamma rays at 424.7 Mrad |

| | | |
|---|---|---|
| orange (pink and beige tones)» and «medium orange (pink and beige tones)»] | | |
| medium pinkish orange | 3988 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>.50 g of goethite + .50 g of titanium dioxide (whitened rusty orange) / 1600 °F / 1 h[565] (followed at «medium orange») |
| medium and mat pinkish orange | 3989 | mineral : uraninite<br>rock : medium chocolate-brown (red Bordeau tone)<br>powder : medium milky chocolate-brown<br>origin : Yellowknife, Canada<br><br>production process:<br>(followed from «sunny yellow»)<br>2 g of uraninite + 100 ml hydrochloric acid / soaking: 4 years / drying on hot plate[566] |
| medium orange (pink and brown tones) | 3990 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>we connect the tube conducting the $COCO_2$ on the furnace / 0↑1300 °F / sweeping with a neutral gas (oxygen: 10.1%; balance: argon) / immediate removal |
| orange (copper tone) | | |
| | | mineral : apatite<br>rock : dark grass-green (yellow tone), very slightly translucid<br>powder : powder filtered at 14 meshes: very, very light green; powder filtered be- |

719

| | | |
|---|---|---|
| orange (copper tone) | 3991 | neath 14 meshes: light grey (beige tone and green reflection)<br>origin : Ile Calumet, Pontiac county, Québec<br><br>mineral : cement[1138]<br>powder : white<br><br><u>production process:</u><br>1 g of rocks + 4.50 g of cement / 3 cc of water / manual grinding / moulding / hardening / 0↑1900 °F / irradiated with gamma rays at 18.85 Mrad |
| orange (red tone) or reddish orange | | |
| reddish orange | 3992 | mineral : crocidolite<br>rock : dark greyish blue<br>powder : pale greyish blue<br>origin : Griqualand district, South Africa<br><br><u>production process:</u><br>(followed from «brownish orange [red tone]»)<br>0↑1800 °F<br>(followed at «dark and pronounced Burgundy-red») |
| reddish orange | 3993 | <u>production process:</u><br>1300 °F / 1 h |
| reddish orange<br>\|<br>\|<br>\| | 3994 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br><u>production process:</u><br>.50 g of goethite + .50 g of zirconium silicate (whitened rusty orange) / 0↑1400 °F<br><br>(followed at «red [orange tone]») |
| lighter reddish orange<br>\|<br>\|<br>\|<br>↓ | 3995 | .50 g of goethite + 1 g of zirconium silicate / 0↑1400 °F<br><br>(followed at «brownish red lighter than "brownish red"») |
| light reddish orange | 3996 | .50 g of goethite + 1.50 g of zirconium silicate / 0↑1400 °F<br>(followed at «brownish red lighter than "brownish red"») |

720

| | | |
|---|---|---|
| | | mineral : goethite[106]<br>powder : rusty orange<br>origin : Red Mill, in the suburbs of Cap-de-la-Madeleine, Québec |
| | | <u>production process:</u><br>(followed from «iron-grey» [1 g / 4 g]) |
| reddish orange | 3997 | 4 g of goethite + 1 g of sodium carbonate / 0↑500 °F |
| reddish orange (red tone more accentuated) | 3998 | 4 g of goethite + 1 g of sodium carbonate / 0↑600 °F |
| reddish orange (red tone still more accentuated) | 3999 | 4 g of goethite + 1 g of sodium carbonate / 0↑700 °F |
| ↓ reddish orange (red tone still more accentuated) | 4000 | 4 g of goethite + 1 g of sodium carbonate / 0↑800 °F<br>(followed at «brownish red») |
| | | mineral : jade<br>rock : dark red (orange tone)<br>powder : orange (red tone)<br>origin : China |
| | | <u>production process:</u> |
| reddish orange | 4001 | 3 g of jade + 20 ml phosphoric acid / soaking: 3 d. / drying on hot plate (still humid) / colour of the solid[30] |
| | | mineral : olivine<br>rock : light grey, crystalline<br>powder : very light grey<br>origin : Mont Albert, Gaspésie, Québec |
| | | <u>production process:</u><br>(followed from «beige [orange tone]») |
| reddish orange | 4002 | 0↑1400 °F |
| orange (red tone more accentuated) | 4003 | 0↑1500 °F |
| orange (red tone still a bit more accentuated) | 4004 | 0↑1600 °F |
| orange (red tone still a bit more accentuated) | 4005 | 0↑1800 °F |
| ↓ orange (red tone | 4006 | 0↑1900 °F |

721

| | | |
|---|---|---|
| still a bit more accentuated) | | |
| reddish orange | 4007 | mineral : peridotite<br>rock : medium grey<br>powder : medium brownish grey (green reflection)<br>origin : Thetford Mines, Québec<br><br>production process:<br>2 g of peridotite + 2 g of sodium carbonate / 0↑1500 °F + 1:30 h at 1500 °F (beige [reddish orange tone]) / irradiated with electrons at 162,431 rad |
| reddish orange lighter and more vivid than «medium reddish orange» | 4008 | mineral : crocidolite<br>rock : dark greyish blue<br>powder : pale greyish blue<br>origin : Griqualand district, South Africa<br><br>production process:<br>2 g of crocidolite + 2 g of sodium carbonate / 0↑1200 °F + 1 h at 1200 °F (medium khaki-green [orange brown tone]) / irradiated with gamma rays at 190.22 Mrad<br>(followed at «rusty orange [red tone]») |
| medium reddish orange | 4009 | mineral : cerite<br>rock : dark brownish grey<br>powder : light grey (light brown tone)<br>origin : Jamestown, Boulder county, Colorado, United States<br><br>production process:<br>4 g of cerite + 100 ml hydrochloric acid / soa-king: 2 wk. / drying on hot plate |
| medium reddish orange | 4010 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>(followed from «medium red [orange tone]»)<br>0↑1400 °F / slow cooling in furnace (indian red[107]): .25 g + 1 g of feldspar (dark brown [orange-pink tone]) / 1600 °F / 1 h<br>(followed at «medium red [orange tone]») |

722

| | | |
|---|---|---|
| medium reddish orange | 4011 | mineral : zincite<br>rock : mixture of areas: dark grey / orange-red<br>powder : medium milky chocolate-brown<br>origin : Franklin, New Jersey, United States<br><br><u>production process:</u><br>4 g of zincite + 50 ml hydrochloric acid / soaking: 2 wk. / drying on hot plate |
| medium and vivid reddish orange | 4012 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u><br>1 g of goethite + 1 g of zirconium silicate + 1 g of titanium dioxide / 1600 °F / 1 h<br>(followed at «dark and vivid orange») |
| reddish orange much more intense than «medium reddish orange» | 4013 | mineral : clay<br>block : pale greyish green<br>powder : pale greyish green<br>origin : bank of St. Lawrence river at the rear of the Miguasha Museum, Gaspésie, Québec<br><br><u>production process:</u><br>0↑1900 °F (medium brown [orange-red tone]): 1 g + 50 ml hydrochloric acid / soaking: 2 wk. / drying on hot plate (medium rusty orange) / irradiated with gamma rays at 64.7 Mrad<br>(followed at «dark brown [orange tone]») |
| rutilant reddish orange | 4014 | mineral : rutile<br>powder : dark brown (orange red reflection)<br>origin : North Stradbroke Island, Queensland, Australia<br><br><u>production process:</u><br>0↑1800 °F (dark red [with golden metallic brilliance]): .10 g + 50 ml phosphoric acid / soaking: 4 years / drying on hot plate (still humid) |

| | | |
|---|---|---|
| vivid reddish orange, with apple-green watering [at the surface: a fine layer of «dark chocolate-brown»] | 4014.1 | mineral : malachite<br>rock : ribboned variety of accentuated mint-green<br>powder : light and brilliant mint-green<br>origin : Katanga province, at 300 km of Lubumbachai, Zaïr, Africa<br><br><u>production process:</u><br>1 g of malachite + 5 g of pyrex / manual grinding / heating: 5 °C per min. at 0↑1245 °C + maintenance during 1 h / cooling: 5 °C per min. until ambient temperature is reached / the entity in ambient air |
| 2 areas: vivid reddish orange / very dark chocolate-brown [with «apple-green» watering] | 4014.2 | mineral : chalcocite<br>rock : dark iron-grey (with localized turquoise oxidation)<br>powder : dark iron-grey<br>origin : Butte, Montana, United States<br><br><u>production process:</u><br>1 g of chalcocite + 5 g of pyrex / manual grinding / heating: 5 °C per min. at 0↑1245 °C + maintenance during 1 h / cooling: 5 °C per min. until ambient temperature is reached / the entity in normal atmosphere |
| vivid reddish orange (with «apple-green» particles) | 4015 | mineral : tiger-eye agate<br>rock : orange with silky luster, opaque<br>powder : orange with silky luster<br>origin : Africa<br><br><u>production process:</u><br>3 g of agate + 40 ml hydrochloric acid / soaking: 1 wk. / drying on hot plate |
| dark and vivid reddish orange | 4016 | mineral : biotite gneiss<br>rock : blackish grey, golden vitreous brilliance<br>powder : dark grey<br>origin : Grenville geological province, Québec<br><br><u>production process:</u><br>12 g of gneiss + 40 ml nitric acid / soaking: 22 d. / drying on hot plate |
| | | mineral : malachite<br>rock : ribboned variety of accentuated mint-green |

| | | |
|---|---|---|
| reddish orange a bit more accentuated and darker than «vivid reddish orange» [with a fine «vivid green» layer at the surface] | 4016.1 | powder : light and brilliant mint-green<br>origin : Katanga province, at 300 km of Lubumbachai, Zaïr, Africa<br><br>production process:<br>1 g of malachite + 5 g of pyrex / manual grinding / heating: 5 °C per min. at 0↑1245 °C + maintenance during 1 h / cooling: 5 °C per min. until ambient temperature is reached / the entity in ambient air (vivid reddish orange, with apple-green watering [at the surface: a fine dark chocolate-brown layer]) / irradiated with gamma rays at 9.88 Mrad |
| | 4017 | mineral : industrial pigment[511]<br>powder : vivid reddish orange<br>origin : unknown |
| reddish orange darker than «vivid reddish orange» | 4018 | production process:<br>irradiated with gamma rays at 482.984 Mrad |
| very dark reddish orange | 4019 | mineral : magnetite<br>rock : dark grey, with metallic brilliance<br>powder : dark grey<br>origin : Fosse du Labrador, Québec<br><br>production process:<br>0↑1900 °F (dark chocolate-brown): 1 g + 50 ml hydrochloric acid / soaking: 4 years / drying on hot plate[569] |
| mixture of particles | | |
| vivid reddish orange / very light greenish turquoise | 4020 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «mixture of particles: rusty orange / grey [greenish turquoise tone]»)<br>50 g of asbestos + 200 ml hydrochloric acid <u>or</u> asbestos entirely covered with hydrochloric acid / soaking: 1 wk. / drying on hot plate (vivid yellow): 2 g + 4 g of sodium carbonate / 0↑1600 °F (followed at «vivid greenish turquoise») |
| vivid reddish | 4021 | production process:<br>50 g of asbestos + 200 ml hydrochloric acid <u>or</u> |

725

| | | |
|---|---|---|
| orange / light grey<br>↓<br>vivid reddish orange / very light greenish turquoise | 4022 | asbestos entirely covered with hydrochloric acid / soaking: 1 wk. / drying on hot plate (vivid yellow): 2 g + 3 g of sodium carbonate / 0↑1500 °F<br><br>50 g of asbestos + 200 ml hydrochloric acid <u>or</u> asbestos entirely covered with hydrochloric acid / soaking: 1 wk. / drying on hot plate (vivid yellow): 2 g + 3 g of sodium carbonate / 0↑1600 °F (followed at «light greenish turquoise») |
| reddish orange (violet tone) | | |
| | | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «old rose [pinkish orange tone and light violet reflection]») |
| pale and mat reddish orange (very light violet tone)<br>↓ | 4023 | 50 g of asbestos + 200 ml hydrochloric acid <u>or</u> asbestos entirely covered with hydrochloric acid / soaking: 1 wk. / drying on hot plate (vivid yellow): 4 g + 4 g of sodium carbonate / 0↑1200 °F |
| more accentuated reddish orange (light violet tone) | 4024 | 50 g of asbestos + 200 ml hydrochloric acid <u>or</u> asbestos entirely covered with hydrochloric acid / soaking: 1 wk. / drying on hot plate (vivid yellow): 4 g + 4 g of sodium carbonate / 0↑1300 °F (followed at «greyish beige [reddish orange tone]») |
| reddish orange (brown tone) | | |
| | | mineral : peridotite<br>rock : medium grey<br>powder : medium brownish grey (green reflection)<br>origin : Thetford Mines, Québec<br><br>mineral : sulphur<br>rock : brilliant yellow<br>powder : brilliant yellow<br>origin : unknown<br><br><u>production process:</u> |
| reddish orange (brown tone) | 4025 | 2 g of peridotite + 2 g of sulphur / 1300 °F / 1 h |
| | | mineral : pentlandite[102] |

726

| | | |
|---|---|---|
| medium reddish orange (brown reflection), more vivid and accentuated than «medium and vivid reddish orange (brown tone)» | 4026 | rock : dark iron-grey, with silver and golden yellow metallic brilliance<br>powder : dark iron-grey (pronounced brown tone)<br>origin : Inco Co., Sudbury, Ontario<br><br>production process:<br>(followed from «orange a bit lighter than "medium orange"»)<br>4 g of pentlandite + 80 ml nitric acid / soaking: 2 wk. / separation of the liquid and the solid / desiccation (colour of the liquid: medium and vivid orange) / irradiated with gamma rays at 430.4 Mrad[239] |
| reddish orange (brown tone) [between «medium orange (brownish red tone)» and «dark orange (brownish red tone)»] | 4027 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>mineral : sulphur<br>rock : brilliant yellow<br>powder : brilliant yellow<br>origin : unknown<br><br>production process:<br>2 g of pentlandite + 2 g of sulphur / 1300 °F / 1 h |
| reddish orange (rusty tone) | | |
| reddish orange (rusty tone) more pale than «reddish orange (rusty tone)» | 4028 | mineral : olivine<br>rock : light grey, crystalline<br>powder : very light grey<br>origin : Mont Albert, Gaspésie, Québec<br><br>production process:<br>0†1800 °F (reddish orange): 1 g + 80 ml nitric acid / soaking: 2 wk. / drying on hot plate (dark red [rusty orange tone]) / irradiated with electrons at 302,831 rad[36] |
| | | mineral : solid epidote<br>rock : brownish green |

727

| | | |
|---|---|---|
| | | powder : brownish green<br>origin : James Bay, Québec<br><br>production process: |
| medium reddish orange (rusty tone) | 4029 | 0↑1200 °F (medium beige [light orange tone]): 1 g + 40 ml hydrochloric acid / natural drying |
| orange ochre (red tone) or reddish orange ochre | | |
| | | mineral : ochre[20,568]<br>powder : orange<br>origin : small copper and nickel deposit, in the South-Western area of a mass of serpentinite at 3 km at the West of Saint-Fabien-de-Panet, Québec<br><br>production process: |
| orange ochre (light red tone)<br>↓ | 4030 | 0↑1400 °F |
| more accentuated orange ochre<br>↓ | 4031 | 0↑1500 °F |
| orange ochre still more accentuated | 4032 | 0↑1800 °F<br>(followed at «brown [orange tone]») |
| orange (brick-red tone) | | |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec |

728

| | | |
|---|---|---|
| dark orange (brick-red tone) | 4033 | production process: (followed from «medium brownish orange») 0↑1400 °F / slow cooling in furnace (indian red[107]): 1.50 g + 1 g of feldspar (dark reddish brown): .50 g + .50 g of sulphur + .50 g of titanium dioxide + .50 g of zirconium silicate / 1700 °F / 1 h |

PINK (ORANGE TONE)

| colour obtained | number | mineral / production process |
|---|---|---|
| pink (orange tone) slightly darker than «light pink (orange tone)» | 4034 | mineral : calcite<br>rock : light pink<br>powder : pinkish white<br>origin : Pontiac county, Huddersfield district, Québec<br><br>production process:<br>rock irradiated with electrons at 302,831 rad[36] |
| pink (orange tone) | 4034.1 | mineral : halite<br>rock : colourless<br>powder : colourless<br>origin : Seleine Mine, Iles-de-la-Madeleine, Québec<br><br>mineral : cement[1138]<br>powder : white<br><br>production process:<br>6 g of rocks + 13.74 g of cement + 6.50 cc of water / manual mixing / moulding / hardening / 0↑1900 °F / irradiation with gamma rays[1274] at 18.85 Mrad |
| pink (orange tone) | 4035 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><br>production process:<br>(followed from «light pinkish beige»)<br>0↑1300 °F (pinkish beige a bit more accentuated than «pinkish beige»): 1 g + 4.50 g of cement + 3 cc of water / manual grinding / moulding / |

730

| | | |
|---|---|---|
| | | hardening / 0↑1300 °F (followed at «brown») |
| | | mineral : granite gneiss<br>rock : reddish beige<br>powder : medium pink (light brown tone)<br>origin : Lac Beauport, region of the city of Québec, Québec<br><br>production process:<br>(followed from «pink more accentuated than "pink"»)<br>powder irradiated with gamma[45,571] rays at: |
| pink (light orange tone), more accentuated than «pink (orange tone)» | 4036 | 10 Mrad |
| ↓ | | |
| pink still a bit more accentuated (light orange tone) | 4037 | 57.4 Mrad |
| ↓ | | |
| pink much more accentuated (light orange tone) | 4038 | 64.7 Mrad |
| ↓ | | |
| pink a bit more acentuated (light orange tone) | 4039 | 102.4 Mrad |
| ↓ | | |
| pink still a bit more accentuated (light orange tone) | 4040 | 148.4 Mrad |
| ↓ | | |
| pink still a bit more accentuated (light orange tone) | 4041 | 201.6 Mrad |
| ↓ | | |
| darker pink (light orange tone) | 4042 | 247.6 Mrad<br>(followed at «orange-pink [beige tone]») |
| | 4043 | mineral : calcite<br>rock : pink (salmon tone)<br>powder : pinkish white<br>origin : Pontiac county, Huddersfield district, Québec<br><br>production process:<br>rock irradiated with gamma rays at: |
| pink (orange tone) | 4044 | 5 Mrad |

| | | |
|---|---|---|
| much more accentuated than «pink (orange tone)» | 4045 | 5.7 Mrad |
| ↓ | | |
| pink (orange tone still more accentuated) | 4046 | 10 Mrad |
| ↓ | | |
| pink (orange tone still much more accentuated) | 4047 | 57.4 Mrad<br>(followed at «orange-pink [brown tone]») |
| medium pink (light orange tone) | 4048 | mineral : fluorine<br>rock : light pink, translucid<br>powder : white (light pink reflection)<br>origin : Saint-Lawrence Fluorspar Company, Saint-Lawrence, Newfoundland<br><br>production process:<br>1000 °C / 1 h |
| medium pink (orange tone) | 4049 | production process:<br>2 g of fluorine + 20 ml nitric acid / soaking: 3 d. / drying on hot plate |
| medium pink (orange tone), mat | 4050 | mineral : biotite gneiss<br>rock : blackish grey, golden vitreous brilliance<br>powder : dark grey<br>origin : Grenville geological province, Québec<br><br>production process:<br>1600 °F / 15 h |
| orange-pink (beige tone) | | |
| pale orange-pink (light beige tone) | 4051 | mineral : goethite[106]<br>powder : rusty orange<br>origin : Red Mill, in the suburbs of Cap-de-la-Madeleine, Québec<br>production process:<br>(followed from «pink [beige tone]»)<br>0↑1400 °F / slow cooling in furnace (indian red[107]): 40 g + 200 ml phosphoric acid / soaking: 3 wk. / drying on hot plate [still humid] (light candy pink, fluorescent) / irradiated with gamma rays at 424.7 Mrad |

| | | |
|---|---|---|
| | | mineral : granite gneiss<br>rock : reddish beige<br>powder : medium pink (light brown tone)<br>origin : Lac Beauport, region of the city of Québec, Québec |
| orange-pink (beige tone) | 4052 | production process:<br>(followed from «pink [orange tone]»)<br>powder irradiated with gamma rays at 287.3 Mrad<br>(followed at «orange [pink and beige tones]») |
| orange-pink (brown tone) | | |
| | | mineral : vesuvianite<br>rock : lilac<br>powder : lilac<br>origin : John Mansville Mine, Asbestos, Québec |
| pale and mat orange-pink (brown tone) | 4053 | production process:<br>0↑600 °F (lilac [light grey tone]): .50 g + 40 ml hydrochloric acid / natural drying |
| | | mineral : calcite<br>rock : pink (salmon tone)<br>powder : pinkish white<br>origin : Pontiac county, Huddersfield district, Québec |
| | | production process:<br>(followed from «pink [orange tone]»)<br>rock irradiated with gamma[572] rays at: |
| pink more orange and brown than «accentuated orange-pink (brown tone)»<br>↓ | 4054 | 64.7 Mrad |
| pink more orange and brown than «accentuated orange-pink (brown tone)» | 4055 | 65.704 Mrad<br><br>(followed at «orange») |
| salmon | | |
| | | mineral : ochre[111]<br>powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide |

733

| | | |
|---|---|---|
| | | powder : white<br>origin : NL Chem Canada Inc., Québec<br><br><u>production process:</u><br>(followed from «medium greyish beige [pink tone]»)<br>1 g of ochre + 1 g of zirconium silicate + 1 g of titanium dioxide / 0↑1500 °F<br>(followed at «beige–flesh [salmon tone]») |
| light salmon | 4056 | |
| | 4057 | mineral : shale (formation of Sillery[547])<br>rock : dark mars[753]-violet<br>powder : light mars[753]-violet<br>origin : small copper and nickel deposit, in the South-Western area of a mass of serpentinite at 3 km at the West of Saint-Fabien-de-Panet, Québec<br><br>mineral : nickel<br>powder : dark brownish grey, with metallic brilliance<br><br><u>production process:</u><br>1 g of shale + 1 g of nickel / 2000 °F / 45 min. |
| salmon (light orange tone) | 4058 | |
| | | mineral : shale (formation of Sillery[547])<br>rock : dark mars[753]-violet<br>powder : light mars[753]-violet<br>origin : small copper and nickel deposit, in the South-Western area of a mass of serpentinite at 3 km at the West of Saint-Fabien-de-Panet, Québec<br><br>mineral : chrome<br>powder : light grey, with metallic brilliance<br><br><u>production process:</u><br>1 g of shale + 1 g of chrome / 2000 °F / 45 min. |
| salmon (pronounced orange tone) | 4059 | |
| | 4060 | mineral : shale (formation of Sillery[547])<br>rock : medium brownish red (violet tone)<br>powder : light reddish brown (violet tone), mat<br>origin : cliff of Cap Rouge in the suburbs of the city of Québec, Québec<br><br><u>production process:</u><br>0↑1400 °F / slow cooling in furnace |
| salmon | 4061 | |
| | | mineral : bauxite[92]<br>powder : pinkish beige, mat<br>origin : Alcan Company, French Guyana |

| | | |
|---|---|---|
| | | <u>production process:</u><br>2 g of bauxite + 2 g of sodium carbonate: |
| salmon | 4062 | 0↑1000 °F + 1 h at 1000 °F |
| ↓ | | |
| salmon | 4063 | 0↑1100 °F + 1 h at 1100 °F |
| ↓ | | |
| salmon | 4064 | 0↑1200 °F + 1 h at 1200 °F<br>(followed at «yellow ochre») |
| salmon | 4065 | <u>production process:</u><br>(followed from «medium brown»)<br>0↑1000 °F (pinkish chamois): 3 g + 25 ml nitric acid / soaking: 3 d. / drying on hot plate<br>(followed at «chamois [orange tone]») |
| medium salmon | 4066 | <u>production process:</u><br>1600 °F / 1 h |
| | | mineral : quartz - mica[96,573]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>(followed from «cream a bit darker than "light cream"») |
| medium salmon | 4067 | 0↑ 750 °F |
| ↓ | | |
| medium salmon (more pinkish tone) | 4068 | 0↑1000 °F<br>(followed at «dark pinkish salmon») |
| | | mineral : asbestos[4]<br>rock : dark grey (green reflection)<br>powder : light grey (green reflection)<br>origin : Asbestos Corporation Ltd., Thetford Mines, Québec<br><br><u>production process:</u><br>5 g of asbestos + 80 ml nitric acid / soaking: 2 wk. / drying on hot plate (dark brown [orange tone]) / irradiated with gamma[239] rays at: |
| medium salmon, intense and luminous | 4069 | 190.22 Mrad |
| ↓ | | |
| medium salmon (orange-pink tone) | 4070 | 550.22 Mrad |

| | | |
|---|---|---|
| | | mineral : bauxite[92]<br>powder : pinkish beige, mat<br>origin : Alcan Company, French Guyana<br><br>mineral : nickel<br>powder : dark brownish grey, with metallic brilliance<br><br><u>production process:</u> |
| pronounced salmon<br>↓ | 4071 | 1 g of bauxite + 1 g of nickel / 1800 °F / 45 min. |
| salmon lighter than «pronounced salmon» | 4072 | 1 g of bauxite + 1 g of nickel / 2000 °F / 45 min. |
| dark salmon | 4073 | mineral : bauxite[92]<br>powder : pinkish beige, mat<br>origin : Alcan Company, French Guyana<br><br><u>production process:</u><br>(followed from «vivid orange»)<br>0↑1700 °F (pinkish chamois [lighter than at 1600 °F]): 3 g + 25 ml hydrochloric acid / soaking: 3 d. / drying on hot plate<br>(followed at «beige») |
| dark pinkish salmon | 4074 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>(followed from «medium pinkish salmon»)<br>0↑1500 °F<br>(followed at «orange pinkish brown») |
| salmon (brown tone) | | |
| salmon (brown tone) or brown (salmon tone) | 4075 | mineral : bauxite[92]<br>powder : pinkish beige, mat<br>origin : Alcan Company, French Guyana<br><br><u>production process:</u><br>(followed from «accentuated pinkish beige [brown tone]»)<br>irradiated with gamma rays at 287.3 Mrad[574]<br><br>(followed at «medium milky chocolate-brown») |
| | | mineral : apatite<br>rock : reddish brown<br>powder : light pinkish beige |

| | | |
|---|---|---|
| medium salmon (light brown tone) | 4076 | origin : Calumet, Pontiac county, Québec<br><br>production process:<br>(followed from «brownish beige [pink reflection]») powder irradiated with gamma rays at 424.7 Mrad |
| dark salmon (brown tone) | 4077 | mineral : bauxite[92]<br>powder : pinkish beige, mat<br>origin : Alcan Company, French Guyana<br><br>production process:<br>(followed from «rusty orange [pink tone]») 0↑1500 °F (pinkish chamois): 3 g + 20 ml nitric acid + 5 ml hydrochloric acid / soaking: 3 d. / drying on hot plate (medium and fairly vivid rusty orange [pink tone]) / irradiated with gamma rays at 424.7 Mrad |

PINK

| colour obtained | number | mineral / production process |
|---|---|---|
| pink (lilac tone) | | |
| very weak pink (or beige) [lilac or grey reflection] | 4078 | mineral : cryolite<br>rock : white, crystalline and translucid<br>powder : white<br>origin : Ivigtut, Groenland<br><br>production process:<br>powder irradiated with electrons at 302,831 rad[36,575] |
| pink (light lilac tone) much darker than «light pink (lilac tone)» | 4079 | mineral : vesuvianite<br>rock : lilac<br>powder : lilac<br>origin : John Mansvilie Mine, Asbestos, Québec<br><br>production process:<br>(followed from «pink more accentuated than "light vivid pink"»)<br>0↑1500 °F (fairly vivid light pink) / irradiated with electrons at 305,200 rad[73] |
| lilac-pink (orange tone) | | |
| pink (light lilac and orange tones) more light than «medium lilac-pink (orange tone)» | 4080 | mineral : fluorine<br>rock : light pink, translucid<br>powder : white (light pink reflection)<br>origin : Saint-Lawrence Fluorspar Company, Saint-Lawrence, Newfoundland<br><br>production process:<br>1000 °C / 1 h (medium pink [light orange tone]) / powder irradiated with electrons at 302,831 rad[36] |

| | | |
|---|---|---|
| pink (violet tone) | | |
| pink (violet tone) much darker than «very, very light pink (violet tone)» | 4081 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>0↑2300 °F (light grey [pinkish beige tone]) / irradiated with gamma rays at 64.7 Mrad<br><br>(followed at «medium greyish beige») |
| light pink (violet tone) | 4082 | mineral : smaltite[25], a variety of skutterudite<br>rock : dark iron-grey, with silver metallic brilliance<br>powder : dark grey<br>origin : Cobalt, Ontario<br><br>production process:<br>0↑1900 °F (dark brown): .30 g + 50 ml hydrochloric acid / soaking: 2 wk. / separation of the liquid and the solid / drying on hot plate (colour of the liquid: very intense peacock-blue) / irradiated with electrons at 162,431 rad |
| light pink (violet tone) | 4083 | mineral : nickel sulphide<br>rock : dark grey<br>powder : dark grey<br>origin : Sudbury, Ontario<br><br>production process:<br>35 g of nickel sulphide + 100 ml phosphoric acid / soaking: 3 wk. / separation of the liquid and the solid / drying on hot plate (still humid) / colour of the liquid[7,578] |
| light pink (violet tone) | 4084 | mineral : vesuvianite<br>rock : lilac<br>powder : lilac<br>origin : John Mansville Mine, Asbestos, Québec<br><br>production process:<br>0↑1500 °F (fairly vivid light pink): 1 g + 40 ml nitric acid / natural drying |

| | | |
|---|---|---|
| light and vivid pink (violet tone) | 4085 | <u>production process:</u><br>12 g of vesuvianite + 40 ml nitric acid / soaking: 1 wk. / drying on sand bath[579] |
| pink (violet tone) | 4086 | mineral : barite<br>rock : pinkish white, cristalline and translucid<br>powder : white<br>origin : Niobec Mine, Saint-Honoré, Saguenay, Québec<br><br><u>production process:</u><br>4 g of barite + 50 ml sulphuric acid / soaking: 2 wk. / drying on hot plate (white, transparent as salt) / irradiated with gamma rays at 64.7 Mrad (followed at «reddish brown [crimson reflection] or brownish red [crimson reflection]») |
| pink (violet tone) [with medium milky chocolate-brown areas] | 4087 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br><u>production process:</u><br>(followed from «medium milky chocolate-brown [pinkish orange tone]»)<br>0↑1400 °F / slow cooling in furnace (indian red[107]): 1 g + 1 g of sulphur + 27.40 g of cement + 13 cc of water / manual grinding / moulding / hardening / 0↑1600 °F<br>(followed at «greyish beige [pinkish tone]») |
| pink (light violet tone) more accentuated than «pink (violet tone)» | 4088 | mineral : cryolite<br>rock : white, crystalline and translucid<br>powder : white<br>origin : Ivigtut, Groenland<br><br><u>production process:</u><br>(followed from «light pink»)<br>rock irradiated with gamma[239] rays at 604.53 Mrad[580] |

| | | |
|---|---|---|
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br>production process:<br>0↑1400 °F / slow cooling in furnace (indian red[107]): 1 g + 1 g of sulphur + 1 g of sodium carbonate + 27.40 g of cement + 13 cc of water / manual grinding / moulding / hardening / 0↑1500 °F (followed at «medium pink [beige tone]») |
| medium pink (violet tone) | 4089 | |
| vivid pink (light violet tone) | 4090 | mineral : smaltite[25], a variety of skutterudite<br>rock : dark iron-grey, with silver metallic brilliance<br>powder : dark grey<br>origin : Cobalt, Ontario<br><br>production process:<br>0↑1900 °F (dark brown): .30 g + 100 ml phosphoric acid / soaking: 4 yr. / drying on hot plate (still humid) / colour of the liquid[160,581] |
| mixture of particles | | |
| medium pink (violet tone) / medium and luminous red | 4091 | mineral : smaltite[25], a variety of skutterudite<br>rock : dark iron-grey, with silver metallic brilliance<br>powder : dark grey<br>origin : Cobalt, Ontario<br><br>production process:<br>3 g of smaltite + 80 ml nitric acid / soaking: 2 wk. / separation of the liquid and the solid / drying on hot plate / colour of the liquid[582] |
| | | production process:<br>3 g of smaltite + 80 ml nitric acid / soaking: 2 wk. / separation of the liquid and the solid / drying on hot plate (colour of the liquid: mixture of particles: medium pink [violet tone] / medium and luminous red) / irradiated with gamma[239] rays at: |

| | | |
|---|---|---|
| pink (violet tone) and luminous red a bit more pale than «medium pink (violet tone)» and «medium red» ↓ | 4092 | 64.7 Mrad |
| slightly darker violet-pink (brown tone) and brownish red | 4093 | 424.7 Mrad |
| pink (crimson tone) | | |
| medium crimson pink (light brown tone) | 4094 | mineral : fluorine<br>rock : colourless, transparent<br>powder : colourless<br>origin : unknown<br><br>production process:<br>(followed from «brownish grey»)<br>2 g of fluorine + 20 ml hydrofluoric acid / soaking: 24 h / drying in oven at 100 °F (creamy white [grey reflection]) / irradiated with gamma rays at 424.7 Mrad |
| pink (lees wine coloured tone) | | |
| pink (lees wine coloured tone) | 4095 | mineral : pyrolusite[101]<br>rock : black (light brown tone), mat<br>powder : black (light brown tone), mat<br>origin : probably Nova Scotia<br><br>production process:<br>110 g of pyrolusite + 150 ml phosphoric acid / soaking: 2 wk. / separation of the liquid[583] and the solid / drying of the 1st liquid on hot plate (colour of the 1st liquid: crimson-violet) [still humid] / addition to the same solid of 150 ml phosphoric acid / soaking: 1 wk. / boiling on hot plate during 2 d. / separation of the 2nd liquid and the solid (crimson-violet darker and more intense than the «crimson-violet» of the 1st liquid) / drying of the 2nd liquid on hot plate (a deposit is formed at the bottom) / separation of the liquid and the deposit / drying of the deposit on hot plate (still humid) / colour of the deposit, which has the consistency of a paste |
| pink (brownish lees wine coloured) | | |
| | | vegetable : lees wine coloured<br>powder : lees wine coloured pink |

| | | |
|---|---|---|
| pink (brownish wine tone) | 4095.1 | production process:<br>irradiated with gamma rays at 2.26 Mrad |
| pearly pink | | |
| pearly pink, with metallic brilliance | 4096 | mineral : beryl<br>rock : very light yellowish green, slightly translucid<br>powder : white (green reflection)<br>origin : Lacorne district, Abitibi, Québec<br><br>mineral : sulphur<br>rock : brilliant yellow<br>powder : brilliant yellow<br>origin : unknown<br><br>production process:<br>1 g of beryl + 2 g of sodium carbonate + 1 g of sulphur / 1600 °F / 1 h[584] |
| pearly pink, with metallic brilliance | 4097 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): 1 g + 2 g of sodium carbonate + 1 g of sulphur / 0↑1500 °F[585] |
| intense pearly pink, with metallic brilliance | 4098 | 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): 1 g + 2 g of sodium carbonate + 1 g of sulphur / 0↑1600 °F[585] |
| ↓ | | |
| darker pearly pink, with metallic brilliance | 4099 | 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying |

| | | |
|---|---|---|
| | | on hot plate (vivid sunny yellow [light green tone]): 1 g + 2 g of sodium carbonate + 1 g of sulphur / 0↑1700 °F[585] (followed at «pearly pink [brown tone], with metallic brilliance») |
| pearly pink, with metallic brilliance (the tone differs from above) | 4100 | <u>production process:</u> 1 g of asbestos + 2 g of sodium carbonate + 1 g of sulphur / 0↑1700 °F |
| pearly pink | 4101 | <u>production process:</u> 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): 1 g + 1 g of sulphur / 0↑1700 °F |
| pearly pink (copper tone) | | |
| pearly pink (copper tone), with metallic brilliance | 4102 | mineral : hornblende<br>rock : medium evergreen (light grey tone), with a vitreous brilliance<br>powder : medium cold grey (light green tone)<br>origin : Abitibi, Québec<br><br>mineral : sulphur<br>rock : brilliant yellow<br>powder : brilliant yellow<br>origin : unknown<br><br><u>production process:</u> 1 g of hornblende + 2 g of sodium carbonate + 1 g of sulphur / 1600 °F / 1 h[586] |
| pearly pink (brown tone) | | |
| | | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown |

| | | |
|---|---|---|
| pearly pink (brown tone), with metallic brilliance<br>↓ | 4103 | <u>production process:</u><br>(followed from «pearly pink darker than "pearly pink", with metallic brilliance»)<br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): 1 g + 2 g of sodium carbonate + 1 g of sulphur / 0↑1800 °F |
| pearly pink (more accentuated brown tone), with metallic brilliance | 4104 | 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): 1 g + 2 g of sodium carbonate + 1 g of sulphur / 0↑1900 °F |
| pink (yellow tone) | | |
| pink (yellow tone) a bit more pink and yellow than «light pink (yellow tone)» | 4105 | mineral : amazonite<br>rock : light greenish turquoise<br>powder : white (turquoise reflection)<br>origin : Lac Sairs, Témiscamingue, Québec<br><br><u>production process:</u><br>1000 °C / 1 h (light pink) / powder irradiated with gamma rays at 63.984 Mrad<br><br>(followed at «light pinkish beige») |
| pink (light yellow tone) | 4106 | mineral : goethite[106]<br>powder : rusty orange<br>origin : Red Mill, in the suburbs of Cap-de-la-Madeleine, Québec<br><u>production process:</u><br>0↑1400 °F / slow cooling in furnace (indian red[107]): 40 g + 200 ml phosphoric acid / soaking: 3 wk. / drying on hot plate [still humid] (light candy pink) / irradiated with electrons at 162,431 rad<br>(followed at «pink more pale than "pink"») |
| pink (yellow tone) | 4107 | <u>production process:</u><br>0↑1400 °F / slow cooling in furnace (indian red[107]): 40 g + 200 ml phosphoric acid / soaking: 3 wk. / drying on hot plate [still humid] (light candy pink) / rinsed with soapy water (very, very light candy pink) / irradiated with gamma rays at 63.984 Mrad<br>(followed at «pinkish beige») |

| pink | | |
|---|---|---|
| | | mineral : barite<br>rock : pinkish white<br><br>powder : white<br>origin : Niobec Mine, Saint-Honoré, Saguenay, Québec<br><br>production process:<br>powder irradiated with gamma rays at: |
| light pink tint | 4108 | 5 Mrad[588] |
| ↓ | | |
| which accentuates | 4109 | 10 Mrad |
| itself and becomes | 4110 | 57.4 Mrad |
| ↓ | | |
| pink and grey and | 4111 | 65.704 Mrad |
| then ↓ | | |
| becomes a bit more accentuated | 4112 | 102.4 Mrad<br>(followed at «beige-pink tone») |
| | | mineral : vesuvianite<br>rock : lilac<br>powder : lilac<br>origin : John Mansville Mine, Asbestos, Québec<br><br>production process: |
| very, very pale pink [almost white] | 4113 | 0↑1500 °F (fairly vivid light pink): 1 g + 40 ml sulphuric acid / soaking: 6 d. / drying on hot plate |
| | | mineral : smaltite[25], a variety of skutterudite<br>rock : dark iron-grey, with silver metallic brilliance<br>powder : dark grey<br>origin : Cobalt, Ontario<br><br>production process: |
| pale pastel pink | 4114 | 3 g of smaltite + 80 ml nitric acid / soaking: 2 wk. / separation of the liquid and the solid / drying on hot plate (colour of the solid: pink) / irradiated with gamma rays at 64.7 Mrad (followed at «dark beige [light orange-pink tone]») |
| | | mineral : orthoclase<br>rock : light pinkish beige<br>powder : very light beige<br>origin : mine near Buckingham, Papineau county, Québec<br><br>production process: |
| very, very light pink | 4115 | 2 g of orthoclase + 20 ml hydrochloric acid / soaking: 3 d. / drying on hot plate |

| | | |
|---|---|---|
| very, very light pink | 4116 | <u>production process:</u><br>2 g of orthoclase + 20 ml sulphuric acid / soa-king: 3 d. / drying on hot plate |
| | 4116.1 | mineral : selenium<br>powder : dark metallic grey<br>origin : Minéraux Noranda Inc., lot 3847, Montréal, Québec |
| very, very light pink | 4116.2 | <u>production process:</u><br>2 independent masses of 150 g of molten glass (so-dalime), each collected at the state of fusion in the furnace (1200 °C) on 2 independent metal rods / 2 g of selenium are sprinkled at the surface of only one side of one of the 2 masses, which is covered with the other mass / then, the 2 surfaces are joined, imprisonning the selenium between the 2 masses of glass / the entirety is then put back into the furnace and brought back to the state of fusion at 1200 °C / then, the resulting mass is taken off the metal rods |
| very, very light pink | 4117 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>1000 °C / 1 h (white [yellow reflection]) / powder irradiated with electrons at 302,831 rad[45] |
| very light pink | 4118 | mineral : vesuvianite<br>rock : lilac<br>powder : lilac<br>origin : John Mansville Mine, Asbestos, Québec<br><br><u>production process:</u><br>(followed from «white [pink reflection]»)<br>0↑1400 °F<br>(followed at «fairly vivid light pink») |
| | | mineral : bauxite[92]<br>powder : pinkish beige, mat<br>origin : Alcan Company, French Guyana<br><br>mineral : pyrochlore<br>powder : reddish brown<br>origin : De-Mix quarry, North side of Mont Saint-Hilaire, Rouville county, Québec |

| | | |
|---|---|---|
| light and cold pink and more pale than «light pink» | 4119 | production process:<br>.50 g of pyrochlore + .50 g of bauxite / 0↑1900 °F (light pinkish chamois) / irradiated with gamma rays at 64.7 Mrad (followed at «medium milky chocolate-brown [orange reflection]») |
| | | mineral : serandite<br>rock : orange-pink or salmon (with more orange areas)<br>powder : pinkish white<br>origin : De-Mix quarry, North side of Mont Saint-Hilaire, Rouville county, Québec<br><br>production process: |
| pink more pale than «light pink» | 4120 | powder irradiated with electrons at 302,831 rad[36] |
| | | mineral : pyrolusite[101]<br>rock : black (light brown tone), mat<br>powder : black (light brown tone), mat<br>origin : probably Nova Scotia<br><br>production process: |
| light pastel pink | 4121 | 110 g of pyrolusite + 150 ml phosphoric acid / soaking: 2 wk. / separation of the liquid[583] and the solid / drying of the 1st liquid on hot plate (colour of the 1st liquid: crimson-violet) [still humid] / addition to the same solid of 150 ml phosphoric acid / soaking: 1 wk. / boiling on hot plate during 2 d. / separation of the solid and the 2nd liquid (crimson-violet more dark and intense than the «crimson-violet» of the 1st liquid) / drying of the 2nd liquid on hot plate (a deposit is formed at the bottom) / separation of the liquid and the deposit / drying on hot plate of the 2 nd liquid<br>/ colour of the 2nd liquid which is completely dry[589] |
| | | mineral : smaltite[25], a variety of skutterudite<br>rock : dark iron-grey, with silver metallic brilliance<br>powder : dark grey<br>origin : Cobalt, Ontario<br><br>production process:<br>3 g of smaltite + 80 ml sulphuric acid / soaking: 2 wk. / separation of the liquid and the solid / drying on hot plate |
| light pink | 4122 | colour of the solid |
| ↓ | | |
| more acute pink | 4123 | colour of the liquid |

748

| | | |
|---|---|---|
| light pink<br>↓<br>light pink | 4124<br><br>4125 | mineral : amazonite<br>rock : light greenish turquoise<br>powder : white (turquoise reflection)<br>origin : Lac Sairs, Témiscamingue, Québec<br><br>production process:<br>1000 °C / 1 h<br><br>0↑1000 °F |
| light pink | 4126 | mineral : amazonite<br>rock : light greenish turquoise<br>powder : white (turquoise reflection)<br>origin : Lac Sairs, Témiscamingue, Québec<br><br>mineral : calcite<br>powder : white<br>origin : Calcite du Nord Company, Saint-Eugène de Mistassini, Lac Saint-Jean, Québec<br><br>production process:<br>1 g of amazonite + 1 g of calcite / 1000 °C / 1 h |
| pink a bit more accentuated than «light pink» | 4127 | mineral : vesuvianite<br>rock : lilac<br>powder : lilac<br>origin : John Mansville Mine, Asbestos, Québec<br><br>production process:<br>12 g of vesuvianite + 40 ml nitric acid / soaking: 1 wk. / drying on sand bath (light and vivid pink [violet tone]) / irradiated with electrons at 164,800 rad<br>(followed at «old rose more intense and darker than "light old rose"») |
| pink more accentuated than «light pink» | 4128 | mineral : serandite<br>rock : orange-pink or salmon (with more orange areas)<br>powder : pinkish white<br>origin : De-Mix quarry, North side of Mont Saint-Hilaire, Rouville county, Québec<br><br>production process:<br>2 g of serandite + 20 ml nitric acid / soaking: 3 d. / drying on hot plate |
| | | mineral : vesuvianite<br>rock : lilac |

| | | |
|---|---|---|
| fairly vivid light pink | 4129 | powder : lilac<br>origin : John Mansville Mine, Asbestos, Québec<br><br>production process:<br>(followed at «very light pink»)<br>0↑1500 °F<br>(followed at «light beige») |
| light pink tint<br>↓<br>light pink | 4130<br><br>4131 | mineral : cryolite<br>rock : white, crystalline and translucid<br>powder : white<br>origin : Ivigtut, Groenland<br><br>production process:<br>rock irradiated with gamma rays at:<br>65.704 Mrad<br><br>244.53 Mrad[590]<br>(followed at «pink [light violet tone]») |
| light pink<br>↓<br>pink a bit more accentuated | 4132<br><br>4133 | production process:<br>2 g of cryolite + 2 g of sodium carbonate / 0↑1500 °F + 1 h at 1500 °F (white [beige reflection]) / irradiated with gamma rays at:<br>64.7 Mrad<br><br>424.7 Mrad |
| light pink | 4134 | mineral : orthoclase<br>rock : light pinkish beige<br>powder : very light beige<br>origin : mine near Buckingham, Papineau county, Québec<br><br>production process:<br>powder irradiated with gamma rays at 64.7 Mrad[591]<br>(followed at «medium greyish beige [light orange tone]») |
| light pink | 4135 | production process:<br>1000 °C / 1 h (very light pinkish beige) / powder irradiated with electrons at 302,831 rad[36] |
| | | mineral : serandite<br>rock : orange-pink or salmon (with more orange areas)<br>powder : pinkish white<br>origin : De-Mix quarry, North side of Mont Saint-Hilaire, Rouville county, Québec |

| | | |
|---|---|---|
| light pink<br>↓<br>more intense pink | 4136<br><br>4137 | production process:<br>rock irradiated with gamma[45,433,592] rays at:<br>244.53 Mrad<br><br>604.53 Mrad |
| pink much more intense than «light pink» | 4138 | production process:<br>powder irradiated with gamma rays at 64.7 Mrad<br><br>(followed at «light beige [orange-pink tone]») |
| pink more accentuated than «vivid light pink» | 4139 | mineral : vesuvianite<br>rock : lilac<br>powder : lilac<br>origin : John Mansville Mine, Asbestos, Québec<br><br>production process:<br>0↑1500 °F (fairly vivid light pink) / irradiated with electrons at 164,800 rad<br>(followed at «pink [light lilac tone]») |
| pink much darker than «light pink» | 4140 | mineral : smaltite[25], a variety of skutterudite<br>rock : dark iron-grey, with silver metallic brilliance<br>powder : dark grey<br>origin : Cobalt, Ontario<br><br>production process:<br>3 g of smaltite + 80 ml sulphuric acid / soaking: 2 wk. / separation of the liquid and the solid / drying on hot plate (colour of the solid: light pink) / irradiated with gamma rays at 64.7 Mrad (followed at «medium milky chocolate-brown [lilac-grey tone]») |
| | | mineral : serandite<br>rock : orange-pink or salmon (with more orange areas)<br>powder : pinkish white<br>origin : De-Mix quarry, North side of Mont Saint-Hilaire, Rouville county, Québec<br><br>production process:<br>rock irradiated with electrons[45,433] at: |

| | | |
|---|---|---|
| pink more pale than «pink» ↓ | 4141 | 162,431 rad |
| pink much more pale than «pink» | 4142 | 302,831 rad[45] |
| pink more pale than «pink» | 4143 | mineral : goethite[106]<br>powder : rusty orange<br>origin : Red Mill, in the suburbs of Cap-de-la-Madeleine, Québec<br><br><u>production process:</u><br>(followed from «pink [light yellow tone]») 0↑1400 °F / slow cooling in furnace (indian red[107]): 40 g + 200 ml phosphoric acid / soaking: 3 wk. / drying on hot plate [still humid] (light candy pink, fluorescent) / irradiated with electrons at 302,831 rad[45] |
| pink | 4144 | mineral : smaltite[25], a variety of skutterudite<br>rock : dark iron-grey, with silver metallic brilliance<br>powder : dark grey<br>origin : Cobalt, Ontario<br><br><u>production process:</u><br>3 g of smaltite + 80 ml nitric acid / soaking: 2 wk. / separation of the liquid and the solid / drying on hot plate / colour of the solid[593] |
| pink | 4145 | mineral : fluorine<br>pierre : pinkish lilac, opaque<br>poudre : very light lilac-grey, almost white<br><br><u>production process:</u><br>2 g of fluorine + 20 ml nitric acid / soaking: 3 d. / drying on hot plate[24] |
| pink more accentuated than «pink» | 4146 | mineral : granite gneiss<br>rock : reddish beige<br>powder : medium pink (light brown tone)<br>origin : Lac Beauport, region of the city of Québec, Québec<br><br><u>production process:</u><br>powder irradiated with gamma[45,571] rays at:<br>5 Mrad |
| pink more accentuated than «pink» | 4147 | 5.7 Mrad |

| | | |
|---|---|---|
| | | (followed at «pink [orange tone]») |
| | | mineral : goethite[106]<br>powder : rusty orange<br>origin : Red Mill, in the suburbs of Cap-de-la-Madeleine, Québec<br><br>mineral : cement[1138]<br>powder : white<br><br><u>production process:</u><br>(followed from «greyish pink»)<br>1 g of goethite + 27.40 g of cement + 13 cc of water / manual grinding / moulding / hardening: |
| pink more accentuated than «pink» | 4148 | 0↑1500 °F |
| pink a bit darker | 4149 | 0↑1600 °F |
| pink still a bit darker | 4150 | 0↑1700 °F<br>(followed at «brown») |
| mixture of particles | | |
| | | mineral : smaltite[25], a variety of skutterudite<br>rock : dark iron-grey, with silver metallic brilliance<br>powder : dark grey<br>origin : Cobalt, Ontario<br><br><u>production process:</u> |
| pink / brown | 4151 | 3 g of smaltite + 20 ml of a cyanide[255] solution / natural drying |
| | | mineral : stibnite<br>rock : dark grey, with silver and blue metallic brilliance<br>powder : dark grey<br>origin : Consolidated Durham Mine, Saint-Georges, New Brunswick<br><br><u>production process:</u> |
| pink / beige | 4152 | 1 g of stibnite + 80 ml phosphoric acid / soaking: 2 wk. / drying on hot plate (still humid) / colour of the solid[9] |
| | | mineral : fluorine<br>rock : white (pink reflection), translucid<br>powder : white (grey reflection)<br>origin : Saint-Lawrence Fluorspar Company, |

| | | |
|---|---|---|
| pink / cristalline white | 4153 | Saint-Lawrence, Newfoundland<br><br>mineral : sulphur<br>rock : brilliant yellow<br>powder : brilliant yellow<br>origin : unknown<br><br>production process:<br>2 g of fluorine + 2 g of sulphur / 1300 °F / 1 h |
| light pink / blue | 4154 | mineral : barite<br>rock : pinkish white<br><br>powder : white<br>origin : Niobec Mine, Saint-Honoré, Saguenay, Québec<br><br>production process:<br>1700 °F / 1 h (cream) / irradiated with gamma rays at 64.7 Mrad (followed at «medium greyish beige [orange tone]») |
| candy pink | | |
| very, very light candy pink | 4155 | mineral : goethite[106]<br>powder : rusty orange<br>origin : Red Mill, in the suburbs of Cap-de-la-Madeleine, Québec<br><br>production process:<br>0↑1400 °F / slow cooling in furnace (indian red[107]): 40 g + 200 ml phosphoric acid / soaking: 3 wk. / drying on hot plate (light candy pink) [still humid][594] / rinsed with soapy water |
| light candy pink, fluorescent (coarse salt texture) | 4156 | production process:<br>0↑1400 °F / slow cooling in furnace (indian red[107]): 40 g + 200 ml phosphoric acid / soaking: 3 wk. / drying on hot plate (still humid)[594] |
| candy pink | 4157 | mineral : pyrolusite[101]<br>rock : black (light brown tone), mat<br>powder : black (light brown tone), mat<br>origin : probably Nova Scotia<br><br>production process:<br>110 g of pyrolusite + 150 ml phosphoric acid / soaking: 2 wk. / separation of the liquid[583] and the solid / drying of the 1st liquid on hot plate (colour of the 1st liquid: crimson-violet) [still humid] / addition to the same solid of 150 ml |

| | | |
|---|---|---|
| | | phosphoric acid / soaking: 1 wk. / boiling on hot plate during 2 days / separation of the solid and the 2nd liquid (violet [crimson tone] darker and more intense than the «violet [crimson tone]» of the 1st liquid) / drying of the 2nd liquid on hot plate / a deposit is formed at the bottom of the 2nd liquid / separation of the liquid and the deposit / drying on hot plate (still humid)[589] / colour of the 2nd liquid[17,595] after the prolonged drying attempt[589] [still humid] |
| pink (chamois tone) | | |
| very light pink (chamois tone), mat | 4158 | mineral : kaolin<br>rock : chalk-white (yellow reflection)<br>powder : chalk-white (yellow reflection)<br>origin : Saint-Rémi d'Amherst, Québec<br><br>mineral : sulphur<br>rock : brilliant yellow<br>powder : brilliant yellow<br>origin : unknown<br><br>production process:<br>2 g of kaolin + 2 g of sulphur / 1300 °F / 1 h (chalk-white [light yellow reflection]) / irradiated with electrons at 302,831 rad[45] |
| pink (chamois tone) more pale or pastel than «light pink (chamois tone)» | 4159 | mineral : bauxite[92]<br>powder : pinkish beige, mat<br>origin : Alcan Company, French Guyana<br><br>production process:<br>0↑1500 °F (light pinkish chamois) / irradiated with gamma rays at 64.7 Mrad<br>(followed at «medium milky chocolate-brown [light orange tone]») |
| pink (chamois tone) slightly more intense and darker [brown] than «light pink (chamois tone)» | 4160 | production process:<br>0↑1500 °F (light pinkish chamois) / irradiated with electrons at 302,831 rad[45]<br><br>(followed at «chamois much more pale than "light chamois"») |
| pink (beige tone) | | |
| | | mineral : barite<br>rock : pinkish white<br><br>powder : white |

| | | |
|---|---|---|
| beige-pink tone | 4162 | origin : Niobec Mine, Saint-Honoré, Saguenay, Québec<br><br>production process:<br>(followed from «pink and grey tints»)<br>powder irradiated with gamma rays at 148.4 Mrad[596]<br>(followed at «pinkish beige [grey tone]») |
| pale pink (beige tone) | 4163 | mineral : apatite<br>rock : medium brownish red<br>powder : light pinkish beige<br>origin : Ile du Calumet, Pontiac county, Québec<br><br>production process:<br>3 g of apatite + 20 ml ether / natural drying |
| pale pink (beige tone) | 4164 | production process:<br>3 g of apatite + 20 ml ammonia / natural drying |
| very light pink (beige tone) | 4165 | mineral : kaolin<br>rock : chalk-white (yellow reflection)<br>powder : chalk-white (yellow reflection)<br>origin : Saint-Rémi d'Amherst, Québec<br><br>production process:<br>0↑1900 °F (white [light pink reflection]) / irradiated with electrons at 302,831 rad[36] |
| light and mat pink (light beige tone) | 4166 | mineral : barite<br>rock : pinkish white<br><br>powder : white<br>origin : Niobec Mine, Saint-Honoré, Saguenay, Québec<br><br>mineral : sulphur<br>rock : brilliant yellow<br>powder : brilliant yellow<br>origin : unknown<br><br>production process:<br>2 g of barite + 2 g of sulphur / 1300 °F / 1 h (very light beige [pink tone]) / irradiated with electrons at 302,831 rad[36] |
| pink (beige tone) | 4167 | mineral : goethite[106]<br>powder : rusty orange<br>origin : Red Mill, in the suburbs of Cap-de-la-Madeleine, Québec<br><br>production process:<br>0↑1400 °F / slow cooling in furnace (indian red[107]): 40 g + 200 ml phosphoric acid / soaking: |

| | | |
|---|---|---|
| | | 3 wk. / drying on hot plate [still humid] (light candy pink) / irradiated with gamma rays at 64.7 Mrad<br>(followed at «pale orange-pink [light beige tone]») |
| pink (beige tone) | 4168 | mineral : smaltite[25], a variety of skutterudite<br>rock : dark iron-grey, with silver metallic brilliance<br>powder : dark grey<br>origin : Cobalt, Ontario<br><br>production process:<br>3 g of smaltite + 80 ml sulphuric acid / soaking: 2 wk. / separation of the liquid and the solid / drying on hot plate (colour of the liquid: pink more acute than «light pink») / irradiated with gamma rays at 64.7 Mrad<br>(followed at «medium milky chocolate-brown [light orange tone]») |
| pink (beige or grey tone)<br>↓<br>pink (beige tone, with grey or blue reflection) | 4169<br><br>4170 | mineral : quartz<br>rock : light pink, translucid<br>powder : very light grey<br>origin : unknown<br><br>production process:<br>rock irradiated with electrons at:<br>155,082 rad<br><br>164,800 rad<br>(followed at «medium brownish grey [pink reflection]») |
| medium pink (beige tone) | 4171 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br>production process:<br>(followed from «medium pink [violet tone]») 0↑1400 °F / slow cooling in furnace (indian red[107]): 1 g + 1 g of sulphur + 1 g of sodium carbonate + 27.40 g of cement + 13 cc of water / manual grinding / moulding / hardening / 0↑1700 °F |

| | | |
|---|---|---|
| | | (followed at «dark greyish beige [pink tone]») |
| medium pink (beige tone), mat<br>↓<br>medium pink (beige tone), mat | 4172<br><br><br>4173 | mineral : vesuvianite<br>rock : lilac<br>powder : lilac<br>origin : John Mansville Mine, Asbestos, Québec<br><br>production process:<br>1500 °F / 1 h<br><br><br>1600 °F / 1 h |
| pink (brown tone) | | |
| light pink (brown tone) | 4174 | mineral : apatite<br>rock : medium brownish red<br>powder : light pinkish beige<br>origin : Ile du Calumet, Pontiac county, Québec<br><br>production process:<br>1000 °C / 1 h |
| pink (brown tone) slightly darker than «light pink (brown tone)» | 4175 | production process:<br>1000 °C / 1 h (light brownish pink) / powder irradiated with gamma rays at 64.7 Mrad (followed at «dark beige [light pinkish orange tone]») |
| pink (brown tone) a bit darker than «light pink (brown tone)»<br>↓<br>pink (brown tone) a bit darker [between «light pink (brown tone)» and «medium pink (brown tone)»] | 4176<br><br><br>4177 | mineral : vesuvianite<br>rock : lilac<br>powder : lilac<br>origin : John Mansville Mine, Asbestos, Québec<br><br>production process:<br>0↑1500 °F (fairly vivid light pink) / irradiated with gamma rays at:<br>64.7 Mrad<br><br><br>424.7 Mrad |
| | | mineral : sandstone<br>rock : medium pinkish brown (light violet |

| | | |
|---|---|---|
| | | tone)<br>powder : medium pinkish brown (light violet tone)<br>origin : at the rear of Percé, Gaspésie, Québec<br><br>production process: |
| pink (brown tone) slightly more orange [shale type (formation of Sillery)] | 4178 | 4 g of sandstone + 80 ml nitric acid / soaking: 2 wk. / drying on hot plate (dark orange-red [brown tone]) / irradiated with gamma rays at 64.7 Mrad (followed at «dark chocolate-brown [light grey tone and localized orange reflection]») |
| | | mineral : serandite<br>rock : orange-pink or salmon (with more orange areas)<br>powder : pinkish white<br>origin : De-Mix quarry, North side of Mont Saint-Hilaire, Rouville county, Québec<br><br>production process: |
| medium pink (brown tone) | 4179 | 2 g of serandite + 20 ml sulphuric acid / soaking: 3 d. / drying on hot plate |
| | | mineral : goethite[106]<br>powder : rusty orange<br>origin : Red Mill, in the suburbs of Cap-de-la -Madeleine, Québec<br><br>mineral : sulphur<br>rock : brilliant yellow<br>powder : brilliant yellow<br>origin : unknown<br><br>mineral : cement[1138]<br>powder : white<br><br>production process:<br>(followed from «mixture of particles: medium brownish pink / medium chocolate-brown [localized green reflection]») |
| medium pink (brown tone) | 4180 | 1 g of goethite + 1 g of sulphur + 1 g of sodium carbonate + 27.40 g of cement + 13 cc of water / moulding / hardening / 0↑1600 °F (followed at «dark greyish beige [green reflection]») |
| mixture of particles | | |
| | | mineral : goethite[106]<br>powder : rusty orange<br>origin : Red Mill, in the suburbs of Cap-de-la -Madeleine, Québec |

| | | |
|---|---|---|
| | | mineral : sulphur<br>rock : brilliant yellow<br>powder : brilliant yellow<br>origin : unknown<br><br>mineral : cement[1138]<br>powder : white<br><br>production process: |
| medium pink (brown tone) / medium chocolate-brown (localized green reflection) | 4181 | 1 g of goethite + 1 g of sulphur + 1 g of sodium carbonate + 27.40 g of cement + 13 cc of water / manual grinding / moulding / hardening / 0↑1300 °F<br>(followed at «medium brownish pink») |
| old rose | | |
| | | mineral : cobalt sulphide[597]<br>rock : dark grey, with metallic brilliance<br>powder : dark grey<br>origin : Cobalt, Ontario<br><br>production process: |
| old rose much more accentuated than «pale old rose» | 4182 | 4 g of cobalt sulphide + 20 ml nitric acid / soaking: 24 h / separation of the liquid and the solid / drying on hot plate (colour of the solid[598]: pale old rose [light orange tone]) / irradiated with gamma rays at 64.7 Mrad<br>(followed at «beige-grey [green tone]») |
| | | mineral : vesuvianite<br>rock : lilac<br>powder : lilac<br>origin : John Mansville Mine, Asbestos, Québec<br><br>production process:<br>(followed from «pink a bit more accentuated than "light pink"») |
| old rose more intense and darker than «light old rose» | 4183 | 12 g of vesuvianite + 40 ml nitric acid / soaking: 1 wk. / drying on sand bath (light and vivid pink [violet tone]) / irradiated with electrons at 305,200 rad[73] |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |

| | | |
|---|---|---|
| | | production process:<br>5 g of iron sulphide - nickel + 25 ml hydrochloric acid / soaking: 3 d. / drying on hot plate (vivid apple-green)[599]: |
| old rose | 4184 | 900 °F / 1 h |
| ↓ | | |
| old rose | 4185 | 1000 °F / 1 h |
| | | mineral : sandstone<br>rock : medium pinkish brown (light violet tone)<br>powder : medium pinkish brown (light violet tone)<br>origin : at the rear of Percé, Gaspésie, Québec |
| old rose | 4186 | production process:<br>4 g of sandstone + 80 ml sulphuric acid / soaking: 2 wk. / drying on hot plate |
| old rose more intense and a bit darker than «old rose» | 4187 | production process:<br>4 g of sandstone + 80 ml sulphuric acid / soaking: 2 wk. / drying on hot plate (old rose) / irradiated with gamma rays at 64.7 Mrad (followed at «medium greyish beige [localized pink reflection]») |
| | | mineral : haematite<br>rock : medium chocolate-brown<br>powder : medium chocolate-brown<br>origin : Nouveau-Québec, Québec |
| medium old rose | 4188 | production process:<br>0↑1800 °F (dark brown [violet tone]): 4 g + 200 ml phosphoric acid / soaking: 4 yrs. / drying on hot plate (still humid)[600] |
| | | mineral : shale (formation of Sillery[547])<br>rock : dark mars-violet[753]<br>powder : light mars-violet[753]<br>origin : small copper and nickel deposit, in the South-Western area of a mass of serpentinite at 3 km at the West of Saint-Fabien-de-Panet, Québec |
| medium old rose | 4189 | production process:<br>3 g of shale + 25 ml nitric acid / soaking: 5 d. / drying on hot plate |
| | | mineral : cobalt sulphide[597]<br>rock : dark grey, with metallic brilliance<br>powder : dark grey<br>origin : Cobalt, Ontario |

| | | |
|---|---|---|
| medium old rose | 4190 | production process: 4 g of cobalt sulphide + 20 ml sulphuric acid / soaking: 24 h / drying on hot plate[601] |
| old rose much more accentuated and slightly darker than «medium old rose» | 4191 | production process: 4 g of cobalt sulphide + 20 ml sulphuric acid / soaking: 24 h / drying on hot plate (medium old rose) / irradiated with gamma rays at 64.7 Mrad (followed at «dark milky chocolate-brown [very, very light orange reflection]») |
| old rose much darker than «medium old rose» | 4192 | production process: 4 g of cobalt sulphide + 20 ml sulphuric acid / soaking: 24 h / drying on hot plate (medium old rose) / irradiated with electrons at 162,431 rad |
| old rose (lilac tone) | | |
| | | mineral : vesuvianite<br>rock : lilac<br>powder : lilac<br>origin : John Mansville Mine, Asbestos, Québec |
| | | production process: powder[602] irradiated with gamma rays at: |
| light old rose (light lilac reflection) | 4193 | 5 Mrad |
| ↓ | 4194 | 10 Mrad |
| more accentuated old rose (lilac reflection) | 4195 | 57.4 Mrad |
| ↓ | | |
| old rose (lilac tone) | 4196 | 64.7 Mrad |
| which | 4197 | 102.4 Mrad |
| becomes | 4198 | 148.4 Mrad |
| more pale | 4199 | 201.6 Mrad |
| ↓ | 4200 | 247.6 Mrad |
| and whitens | 4201 | 287.3 Mrad<br>(followed at «old rose [beige tone]») |
| | | mineral : pyrolusite[101]<br>rock : black (light brown tone), mat<br>powder : black (light brown tone), mat<br>origin : probably Nova Scotia |

| | | |
|---|---|---|
| old rose (lilac tone) | 4202 | production process:<br>1000 °C / 12 h (brownish black): 60 g + 200 ml phosphoric acid / immediately deposited on hot plate / boiling during 2 d. (colour of the liquid: intense crimson-violet [almost opaque]) / separation of the liquid and the solid / drying on hot plate [still humid] / colour of the liquid[17,603,604]<br>(followed at «brownish black [accentuated violet tone]») |
| old rose (orange tone) | | |
| pale old rose (light orange tone) | 4203 | mineral : cobalt sulphide[597]<br>rock : dark grey, with metallic brilliance<br>powder : dark grey<br>origin : Cobalt, Ontario<br><br>production process:<br>4 g of cobalt sulphide + 20 ml nitric acid / soaking: 24 h / separation of the liquid and the solid / drying on hot plate / colour of the solid[598,605] |
| old rose (pinkish orange tone) | | |
| old rose (pinkish orange tone and light violet reflection) | 4204 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «old rose [beige tone and light violet reflection]»)<br>50 g of asbestos + 200 ml hydrochloric acid <u>or</u> asbestos entirely covered with hydrochloric acid / soaking: 1 wk. / drying on hot plate (vivid yellow): 4 g + 4 g of sodium carbonate / 0†1100°F<br>(followed at «pale and mat reddish orange [very light violet tone]») |
| old rose (beige tone) | | |
| old rose (beige tone) | 4205 | mineral : vesuvianite<br>rock : lilac<br>powder : lilac<br>origin : John Mansvile Mine, Asbestos, Québec<br><br>production process:<br>(followed from «old rose [lilac tone]»)<br>powder irradiated with gamma rays at 360 Mrad<br>(followed at «medium beige-flesh [pinkish lilac tone]») |

| | | |
|---|---|---|
| old rose (beige tone and light violet reflection) | 4206 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): 4 g + 4 g of sodium carbonate / 0↑1000 °F (followed at «old rose [pinkish orange tone and light violet reflection]») |
| old rose (orange-pinkish beige tone and violet reflection) | 4207 | production process:<br>(followed from «old rose [grey tone and violet reflection]»)<br>50 g of asbestos + 200 ml hydrochloric acid or asbestos entirely covered with hydrochloric acid / soaking: 1 wk. / drying on hot plate (vivid yellow): 4 g + 2 g of sodium carbonate / 0↑1100 °F (followed at «dark beige [pinkish orange tone]») |
| old rose (brown tone) | | |
| old rose (brown tone), more intense than «old rose (brown tone)» | 4208 | mineral : fluorine<br>rock : reddish violet, translucid<br>powder : very light grey<br>origin : Ohio, United States<br><br>production process:<br>(followed from «grey [pink tone and lilac reflection]»)<br>1 g of fluorine + 1 cc of white transparent synthetic enamel paint for the car / manual grinding / application on a piece of steel sheet used for the car's body measuring 1" x 1" (greyish cream) / irradiated with gamma rays at 57.4 Mrad (followed at «medium chocolate-brown») |
| old rose (grey tone) | | |
| old rose (grey tone) more pale than «light old rose (grey tone)» | 4209 | mineral : apatite<br>rock : medium brownish red<br>powder : light pinkish beige<br>origin : Ile du Calumet, Pontiac county, Québec<br><br>production process:<br>1000 °C / 1 h (light brownish pink) / irradiated with electrons at 302,831 rad[36] |

| | | |
|---|---|---|
| old rose (grey tone and orange—pinkish reflection)<br>↓<br>old rose (grey tone and orange—pinkish reflection slightly more accentuated) | 4210<br><br><br><br>4211 | mineral : asbestos⁴<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): 4 g + 3 g of sodium carbonate:<br>0↑1000 °F<br><br>0↑1100 °F<br><br>(followed at «dark beige [orange-pinkish tone]») |
| old rose (grey tone and violet reflection) | 4212 | production process:<br>50 g of asbestos + 200 ml hydrochloric acid or asbestos entirely covered with hydrochloric acid / soaking: 1 wk. / drying on hot plate (vivid yellow): 4 g + 2 g of sodium carbonate / 0↑1000 °F (followed at «old rose [beige tone with orange-pink and violet reflections]») |
| medium old rose (grey tone and orange reflection) | 4213 | production process:<br>50 g of asbestos + 200 ml hydrochloric acid or asbestos entirely covered with hydrochloric acid / soaking: 1 wk. / drying on hot plate (vivid yellow): 4 g + 1 g of sodium carbonate / 0↑1200 °F (followed at «medium beige [pinkish orange tone]») |
| pink (grey tone) | | |
| very light greyish pink, almost white | 4214 | mineral : vesuvianite<br>rock : lilac<br>powder : lilac<br>origin : John Mansville Mine, Asbestos, Québec<br><br>production process:<br>12 g of vesuvianite + 40 ml sulphuric acid / soaking: 22 d. / drying on hot plate |
| | | mineral : amazonite |

| | | |
|---|---|---|
| light pink (light grey tone) | 4215 | rock : greenish turquoise<br>powder : white (turquoise reflection)<br>origin : Lac Saint-Jean, Québec<br><br>production process:<br>0↑1000 °C (light pink) / irradiated with electrons at 302,831 rad[36] |
| greyish pink | 4216 | mineral : goethite[106]<br>powder : rusty orange<br>origin : Red Mill, in the suburbs of Cap-de-la-Madeleine, Québec<br><br>mineral : cement[1138]<br>powder : white<br><br>production process:<br>1 g of goethite + 27.40 g of cement + 13 cc of water / manual grinding / moulding / hardening / 0↑1300 °F<br>(followed at «pink more accentuated than "pink"») |
| greyish and mat pink more pale than «medium greyish pink» | 4217 | mineral : sodalite<br>rock : light cold blue<br>powder : light grey (light blue tone)<br>origin : Bancroft, Ontario<br><br>mineral : sulphur<br>rock : brilliant yellow<br>powder : brilliant yellow<br>origin : unknown<br><br>production process:<br>2 g of sodalite + 2 g of sulphur / 1300 °F / 1 h (medium pinkish beige) / irradiated with electrons at 302,831 rad[36] |

PINK (RED TONE)

| colour obtained | number | mineral / production process |
|---|---|---|
| medium pink more red and darker than «vivid light pink» | 4218 | mineral : vesuvianite<br>rock : lilac<br>powder : lilac<br>origin : John Mansville Mine, Asbestos, Québec<br><br><u>production process:</u><br>0↑1500 °F (fairly vivid light pink): 1 g + 40 ml ml hydrochloric acid / natural drying |
| pink (red tone) much more intense than «medium pink (red tone)» | 4219 | mineral : fluorine<br>rock : light pink, translucid<br>powder : white (light pink reflection)<br>origin : Saint-Lawrence Fluorspar Company, Saint-Lawrence, Newfoundland<br><br><u>production process:</u><br>1000 °C / 1 h (medium pink [light orange tone]) / powder irradiated with gamma rays at 122.984 Mrad (followed at «very dark chocolate-brown») |
| very intense pink (red tone) | 4220 | mineral : smaltite[25], a variety of skutterudite<br>rock : dark iron-grey, with silver metallic brilliance<br>powder : dark grey<br>origin : Cobalt, Ontario<br><br><u>production process:</u><br>0↑1900 °F (dark brown): .30 g + 50 ml sulphuric acid / soaking: 2 wk. / drying on hot plate |
| pink (red tone) much more accentuated than «very intense pink (red tone)» | 4221 | <u>production process:</u><br>0↑1900 °F (dark brown): .30 g + 50 ml sulphuric acid / soaking: 2 wk. / drying on hot plate (very intense pink [red tone]) / irradiated with gamma rays at 64.7 Mrad<br>(followed at «medium milky chocolate-brown [light orange-pink tone]») |

| | | |
|---|---|---|
| pink (red tone) a bit darker than «very intense pink (red tone)» | 4222 | <u>production process:</u><br>0↑1900 °F (dark brown): .30 g + 50 ml sulphuric acid / soaking: 2 wk. / drying on hot plate (very intense pink [red tone]) / irradiated with electrons at 162,431 rad |
| Burgundy-pink (brown tone) | | |
| Burgundy-pink (brown tone) | 4223 | mineral : crocidolite<br>rock : dark greyish blue<br>powder : pale greyish blue<br>origin : Griqualand district, South Africa<br><br><u>production process:</u><br>(followed from «dark rusty orange»)<br>250 g of crocidolite + 1650 ml hydrochloric acid in a 2000 ml becher or crocidolite entirely cove-red with hydrochloric acid in a vertical container / soaking: 1 wk. / drying on hot plate (formation of two layers of colours: the one on the surface being dark green [mint-green type]) / 1500 °F / 1 h[606,606a]<br>(followed at «red [Burgundy-red type]») |

RED (PINK TONE)

| colour obtained | number | mineral / production process |
|---|---|---|
| medium red (pink tone) | 4224 | mineral : goethite[106]<br>powder : rusty orange<br>origin : Red Mill, in the suburbs of Cap-de-la-Madeleine, Québec<br><br>production process:<br>0↑1400 °F / slow cooling in furnace (indian red[107]): 10 g + 100 ml sulphuric acid / soaking: 1 wk. / drying on hot plate |
| red (pink tone) much more accentuated than «medium red (pink tone)» | 4225 | production process:<br>0↑1400 °F / slow cooling in furnace (indian red[107]): 10 g + 100 ml sulphuric acid / soaking: 1 wk. / drying on hot plate (medium red [tone more pinkish than the «red»]) / irradiated with gamma rays at 64.7 Mrad<br>(followed at «pinkish brown [between "medium pink brown" and "dark pinkish brown"]») |

RED

| colour obtained | number | mineral / production process |
|---|---|---|
| indian red | | |
| | | mineral : goethite[106]<br>powder : rusty orange<br>origin : Red Mill, in the suburbs of Cap-de-la-Madeleine, Québec |
| indian red | 4226 | <u>production process:</u><br>0↑1400 °F / slow cooling in furnace<br>(followed at «indian red [light violet tone]») |
| indian red | 4227 | <u>production process:</u><br>0↑1400 °F / slow cooling in furnace (indian red[107]) / 1300 °F / 1 h[607]<br>(followed at «indian red a bit more violet than "indian red"») |
| | | <u>production process:</u><br>0↑1400 °F / slow cooling in furnace (indian red[107]) / irradiated with gamma[239] rays at: |
| indian red which | 4228 | 5 Mrad |
| \| | 4229 | 5.7 Mrad[608] |
| \| | 4230 | 10 Mrad |
| darkens | 4231 | 57.4 Mrad |
| \| | 4232 | 64.7 Mrad[608] |
| \| and | 4233 | 102.4 Mrad |
| becomes | 4234 | 148.4 Mrad |
| \| more | 4235 | 201.6 Mrad |
| \| brown | 4236 | 247.6 Mrad |
| \| | 4237 | 287.3 Mrad |
| \| | 4238 | 360 Mrad |
| ↓ | 4239 | 365.7 Mrad |
| indian red darker and more brown | 4240 | 424.7 Mrad[609] |
| dark indian red | 4241 | <u>production process:</u><br>2000 °F / 45 min. |
| | | mineral : goethite[106]<br>powder : rusty orange<br>origin : Red Mill, in the suburbs of Cap-de-la-Madeleine, Québec |

| | | |
|---|---|---|
| dark indian red | 4242 | mineral : nickel<br>powder : dark brownish grey, with metalic brilliance<br><br>production process:<br>1 g of goethite + 1 g of nickel / 2000 °F / 45 min.<br>(followed at «brown [violet–red tone]») |
| indian red (violet tone) | | |
| indian red (light violet tone)<br>↓<br>indian red (violet tone) | 4243<br><br>4244 | mineral : goethite[106]<br>powder : rusty orange<br>origin : Red Mill, in the suburbs of Cap-de-la-Madeleine, Québec<br><br>production process:<br>(followed from «indian red»)<br>0↑1700 °F<br><br>0↑1800 °F<br>(followed at «violet [red tone]») |
| indian red a bit more violet than «indian red»<br>↓<br>indian red (violet tone a bit more accentuated than the previous one) | 4245<br><br>4246 | production process:<br>(followed from «indian red»)<br>0↑1400 °F / slow cooling in furnace (indian red[107]) / 1400 °F / 1 h<br><br>0↑1400 °F / slow cooling in furnace (indian red[107]) / 1500 °F / 1 h<br><br>(followed at «dark grey [light violet tone]») |
| lees wine coloured | | |
| lees wine coloured | 4247 | mineral : cobalt sulphide[597]<br>rock : dark grey, with metallic brilliance<br>powder : dark grey<br>origin : Cobalt, Ontario<br><br>production process:<br>4 g of cobalt sulphide + 20 ml nitric acid / soaking: 24 h / separation of the liquid and the solid / drying on hot plate / colour of the liquid[582,611] |
| lees wine coloured (brown tone) | | |

| | | |
|---|---|---|
| lees wine coloured (light brown tone) more intense and darker than «pronounced lees wine coloured (brown tone)» | 4248 | mineral : crocidolite<br>rock : dark greyish blue<br>powder : pale greyish blue<br>origin : Griqualand district, South Africa<br><br>production process:<br>0↑2000 °F (Burgundy-red [brown tone]) / irradiated with gamma rays at 555.92 Mrad[239,612] |
| red (golden tone) | | |
| dark red (with golden metallic luster)<br>↓ | 4249 | mineral : rutile<br>powder : dark brown (orange-red reflection)<br>origin : North Stradbroke Island, Queensland, Australia<br><br>production process:<br>0↑1800 °F |
| dark red (with golden metallic luster)<br>↓ | 4250 | 0↑1900 °F |
| dark red (with golden metallic luster) | 4251 | 0↑2000 °F |
| red (with golden metallic luster) still darker than «dark red (with golden metallic luster)» | 4252 | production process:<br>0↑2000 °F (dark red [with golden metallic brilliance]) / powder irradiated with gamma rays at 64.7 Mrad<br>(followed at «grey [red tone and silver metallic brilliance]») |
| red (orange tone) | | |
| red (orange tone) | 4253 | mineral : goethite[106]<br>powder : rusty orange<br>origin : Red Mill, in the suburbs of Cap-de-la-Madeleine, Québec<br><br>production process:<br>(followed from «rusty orange [accentuated red tone]»)<br>1000 °F / 1 h |

| | | |
|---|---|---|
| ↓<br>red (orange tone)<br>more reddish | 4254 | 1200 °F / 1 h |
| ↓<br>red (orange tone)<br>still more reddish | 4255 | 1300 °F / 1 h |
| red (orange tone) | 4256 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br><u>production process:</u><br>(followed from «reddish orange»)<br>.50 g of goethite + .50 g of zirconium silicate (whitened rusty orange) / 0↑1600 °F<br>(followed at «brownish red» and at «medium caput-mortuum [violet red tone]») |
| red (orange tone) | 4257 | mineral : chalcocite<br>rock : dark iron-grey (with localized turquoise oxidation)<br>powder : dark iron-grey<br>origin : Butte, Montana, United States<br><br><u>production process:</u><br>0↑1900 °F (dark iron-grey): .60 g + 50 ml nitric acid / soaking: 2 wk. / drying on hot plate |
| red (orange tone) | 4258 | mineral : anorthosite<br>rock : light grey<br>powder : very, very light greyish beige<br>origin : rang Sainte-Germaine, Oka, Québec<br><br><u>production process:</u><br>2 g of anorthosite + 20 ml hydrochloric acid / soaking: 3 d. / drying on hot plate |
| red (orange tone) | 4259 | mineral : zincite<br>rock : mixture of areas: dark grey / orange-red<br>powder : medium milky chocolate-brown (red tone)<br>origin : Franklin, New Jersey, United States<br><br><u>production process:</u><br>rock irradiated with gamma rays at 122.984 |

| | | |
|---|---|---|
| darker than «red (orange tone)» / grey darker than «dark grey» | | Mrad[509,1262] / colour of the 2 areas of the rock<br><br>(followed at «reddish brown / blackish brown») |
| red (orange tone) a bit more pale than «medium red (orange tone)» | 4260 | mineral : peridotite<br>rock : medium grey<br>powder : medium brownish grey (green reflection)<br>origin : Thetford Mines, Québec<br><br>production process:<br>0↑1900 °F (brown [orange tone]): .20 g + 50 ml nitric acid / soaking: 2 wk. / drying on hot plate (rusty orange) / irradiated with gamma rays at 424.7 Mrad[81,239] |
| medium red (orange tone) | 4261 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>0↑1400 °F / slow cooling in furnace (indian red[107]): .10 g + 1 g of feldspar (medium brown) / 1600 °F / 1 h<br>(followed at «medium reddish orange») |
| medium red (orange tone) ↓ | 4262 | mineral : jade<br>rock : dark red (orange tone)<br>powder : reddish orange<br>origin : China<br><br>production process:<br>powder irradiated with gamma[36] rays at:<br>64.7 Mrad |
| red (orange tone) darker, more accentuated and red | 4263 | 424.7 Mrad |
| | | mineral : ochre[111]<br>powder : dark reddish brown<br>origin : Red Mill, in the suburbs of Cap-de-la-Madeleine, Québec<br><br>mineral : table salt (NaCl) |

| | | |
|---|---|---|
| | | powder : colourless<br>origin : Sifto Company<br><br>production process:<br>10 g of ochre + 10 g of NaCl: |
| vivid red (orange tone) ↓ | 4264 | 0↑1000 °F |
| red (orange tone) a bit darker than «vivid red (orange tone)» | 4265 | 0↑1300 °F<br><br>(followed at «reddish brown») |
| red (orange tone) a bit more pale, less pronounced, more orange and less red than «dark red (orange tone)» | 4266 | mineral : jade<br>rock : dark red (orange tone)<br>powder : reddish orange<br>origin : China<br><br>production process:<br>powder irradiated with electrons at 302,831 rad[45] |
| medium red (orange tone) | 4267 | mineral : peridotite<br>rock : medium grey<br>powder : medium brownish grey (green reflection)<br>origin : Thetford Mines, Québec<br><br>production process:<br>0↑1900 °F (brown [orange tone]): .20 g + 50 ml nitric acid / soaking: 2 wk. / drying on hot plate |
| red (orange tone) lighter than «vivid red (orange tone)» | 4268 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>.50 g of goethite + 1.50 g of zirconium silicate / 0↑1600 °F<br><br>(followed at «brownish red») |
| red (orange tone) | 4269 | production process:<br>.50 g of goethite + 1 g of zirconium silicate / |

| | | |
|---|---|---|
| lighter than «vivid red (orange tone)» | | 0↑1600 °F<br><br>(followed at «brownish red») |
| dark red (orange tone) | 4270 | mineral : goethite[106]<br>powder : rusty orange<br>origin : Red Mill, in the suburbs of Cap-de-la -Madeleine, Québec<br><br>mineral : feldspar<br>rock : white, opaque<br>powder : white<br>origin : Baraute, Abitibi, Québec<br><br>production process:<br>(followed from «medium brownish orange»)<br>0↑1400 °F / slow cooling in furnace (indian red[107]): 1 g + 1 g of feldspar (dark reddish brown [tends towards Burgundy-red]) / 1700 °F / 1 h |
| dark red (orange tone) | 4271 | mineral : goethite[106]<br>powder : rusty orange<br>origin : Red Mill, in the suburbs of Cap-de-la -Madeleine, Québec<br><br>mineral : feldspar<br>rock : white, opaque<br>powder : white<br>origin : Baraute, Abitibi, Québec<br><br>mineral : zirconium oxide<br>powder : light beige<br>origin : Tam Ceramic Inc., Québec<br><br>production process:<br>1 g of goethite + 1 g of feldspar + 1 g of zirconium oxide / 1850 °F / 30 min. |
| red (rusty orange tone) | | |
| red (rusty orange tone) | 4272 | mineral : chromite<br>rock : blackish grey<br>powder : medium brownish grey<br>origin : Black Lake, near Thetford Mines, Québec<br><br>production process:<br>4 g of chromite + 80 ml hydrochloric acid / soaking: 2 wk. / drying on hot plate |
| | | mineral : olivine<br>rock : light grey, crystalline |

| | | |
|---|---|---|
| | | powder : very light grey<br>origin : Mont Albert, Gaspésie, Québec<br><br>production process:<br>0↑1800 °F (reddish orange): 1 g + 80 ml nitric acid / soaking: 2 wk. / drying on hot plate (dark red [rusty orange tone]) / irradiated with gamma rays at: |
| red (rusty orange) very slightly lighter than «dark red (rusty orange tone)»<br>↓ | 4273 | 64.7 Mrad |
| red (rusty orange) a bit darker [more brown] | 4274 | 424.7 Mrad |
| dark red (rusty orange tone) | 4275 | production process:<br>0↑1800 °F (reddish orange): 1 g + 80 ml nitric acid / soaking: 2 wk. / drying on hot plate |
| orange-red (brown tone) | | |
| dark orange-red (brown tone) | 4276 | mineral : sandstone<br>rock : medium pinkish brown (light violet tone)<br>powder : medium pinkish brown (light violet tone)<br>origin : at the rear of Percé, Gaspésie, Québec<br><br>production process:<br>4 g of sandstone + 80 ml nitric acid / soaking: 2 wk. / drying on hot plate[613] |
| dark orange-red (brown tone)<br>↓ | 4277 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>(followed from «medium brownish orange»)<br>0↑1400 °F / slow cooling in furnace (indian red[107]): 1.50 g + .50 g of feldspar (dark reddish brown) / 1600 °F / 1 h |

| | | |
|---|---|---|
| | | (followed at «light rusty orange») |
| | | (followed from «medium rusty orange») |
| orange-red a bit less dark | 4278 | 0↑1400 °F / slow cooling in furnace (indian red[107]): 1 g + .50 g of feldspar (dark brownish red) / 1600 °F / 1 h |
| | | (followed at «medium brownish orange») |
| ↓ | | (followed from «medium reddish orange») |
| orange-red lighter and more orange | 4279 | 0↑1400 °F / slow cooling in furnace (indian red[107]): .50 g + .50 g of feldspar (dark brownish red) / 1600 °F / 1 h<br>(followed at «medium rusty orange») |
| red | | |
| | | mineral : olivine<br>powder : colourless (green reflection)<br>origin : Mount Haven, United States<br>production process:<br>(followed from «rusty orange more pale than "light rusty orange"») |
| fairly vivid red [red cochineal type] | 4280 | 70 g of olivine + 100 ml nitric acid / soaking: 24 h / drying on hot plate (light and fairly vivid rusty orange) / irradiated with gamma rays at 423.88 Mrad[239] |
| Burgundy-red | | |
| | | mineral : crocidolite<br>rock : dark greyish blue<br>powder : pale greyish blue<br>origin : Griqualand district, South Africa |
| | | production process:<br>(followed from «dark rusty orange [red tone]»)<br>250 g of crocidolite + 1650 ml hydrochloric acid in a 2000 ml becher or crocidolite entirely covered with hydrochloric acid in a vertical container / soaking: 1 wk. / drying on hot plate (formation of 2 layers of superposed colours: the layer at the bottom is dark green [light yellow tone]): |
| light Burgundy-red | 4281 | 1600 °F / 1 h |
| ↓ | | |
| Burgundy-red more accentuated than «light Burgundy-red» | 4282 | 1700 °F / 1 h |

| | | |
|---|---|---|
| red [Burgundy-red type] | 4283 | production process:<br>(followed from «Burgundy-pink [brown tone]» and «dark brownish red»)<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours: the layer at the surface is dark green [mint-green type]) / 1700 °F / 1 h |
| fairly vivid Burgundy-red | 4284 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>1 g of ochre + 1 g of halite / 0↑1000 °F<br>(followed at «dark reddish brown») |
| dark and pronounced Burgundy-red | 4285 | mineral : crocidolite<br>rock : dark greyish blue<br>powder : pale greyish blue<br>origin : Griqualand district, South Africa<br><br>production process:<br>(followed from «reddish orange»)<br>0↑1900 °F<br>(followed at «Burgundy-red [brown tone]») |
| dark Burgundy-red | 4286 | production process:<br>0↑1900 °F (dark and pronounced Burgundy-red): 50 g + 200 ml hydrochloric acid or crocidolite entirely covered with hydrochloric acid / soaking: 1 wk. / drying on hot plate[613a] |
| dark Burgundy-red [tends towards russet] | 4287 | production process:<br>0↑1900 °F (dark and pronounced Burgundy-red): 50 g + 200 ml hydrochloric acid or crocidolite entirely covered with hydrochloric acid / immediate drying on hot plate |
| | | mineral : haematite<br>rock : medium chocolate-brown<br>powder : medium chocolate-brown<br>origin : Nouveau Québec, Québec |

| | | |
|---|---|---|
| intense and dark Burgundy-red | 4288 | production process: 0↑1300 °F (reddish brown darker than «reddish brown») / irradiated with gamma rays at 424.7 Mrad[239] |
| dark Burgundy-red | 4289 | mineral : goethite[106]<br>powder : rusty orange<br>origin : Red Mill, in the suburbs of Cap-de-la-Madeleine, Québec<br><br>production process: 5 g of goethite + 100 ml nitric acid / soaking: 1 wk. / drying on hot plate |
| Burgundy-red much more intense and a bit darker than «dark Burgundy-red»<br>↓ | 4290 | production process: 5 g of goethite + 100 ml nitric acid / soaking: 1 wk. / drying on hot plate (dark Burgundy-red) / irradiated with gamma rays at:<br>64.7 Mrad[239] |
| lighter and more red Burgundy-red | 4291 | 424.7 Mrad |
| Burgundy-red (brown tone) | | |
| Burgundy-red (brown tone) | 4292 | mineral : crocidolite<br>rock : dark greyish blue<br>powder : pale greyish blue<br>origin : Griqualand district, South Africa<br><br>production process: (followed from «dark and pronounced Burgundy-red») 0↑2000 °F |
| Burgundy-red more intense and a bit darker [brown] than «dark Burgundy-red» | 4293 | production process: 0↑1900 °F (dark and pronounced Burgundy-red) / irradiated with gamma rays at 550.22 Mrad[239,535,614] |
| Brugundy-red darker and a bit more | 4294 | production process: 0↑1900 °F (dark and pronounced Burgundy-red): 50 g + 200 ml hydrochloric acid or crocidolite |

| | | |
|---|---|---|
| brown than «dark Burgundy-red» | | entirely covered with hydrochloric acid / soaking: 1 wk. / drying on hot plate (dark Burgundy-red, differs from the previous one) / irradiated with gamma rays at 550.22 Mrad[239,535] |
| Burgundy-red darker than «dark Burgundy-red» and a bit more brown [tends a lot towards russet]» | 4295 | <u>production process:</u> 0↑1900 °F (dark and pronounced Burgundy-red): 50 g + 200 ml hydrochloric acid <u>or</u> crocidolite entirely covered with hydrochloric acid / immediate drying on hot plate (dark Burgundy-red [tends towards russet]) / irradiated with gamma rays at 550.22 Mrad[239,535] |
| red ochre | | |
| | | mineral : ochre[20]<br>powder : orange<br>origin : small copper and nickel deposit, in the South-Western area of a mass of serpentinite at 3 km at the West of Saint-Fabien-de-Panet, Québec |
| dark red ochre (brown tone) | 4296 | <u>production process:</u><br>we connect the conducting tube of the $COCO_2$ gas on the furnace / 0↑1300 °F + 1 h at 1300 °F with gas / slow cooling in furnace in the presence of gas / sweeping with neutral gas (oxygen: 10.1%; balance: argon) or with ambient air before withdrawal |

RED (BROWN TONE)

| colour obtained | number | mineral / production process |
|---|---|---|
| red chestnut | | |
| | | mineral : goethite[106]<br>powder : rusty orange<br>origin : Red Mill, in the suburbs of Cap-de-la-Madeleine, Québec<br><br>production process:<br>0↑1400 °F / slow cooling in furnace (indian red[107]) / 1300 °F / 1 h (indian red [differs from the one obtained when heating 0↑1400 °F]) / irradiated with gamma rays at: |
| red chestnut slightly more intense and luminous than «red chestnut» | 4297 | 64.7 Mrad[239] |
| ↓ | | |
| red chestnut more brown and darker | 4298 | 424.7 Mrad |
| | | production process:<br>0↑1900 °F (reddish violet): .50 g + 1 cc of white transparent printing ink / manual grinding / 1 impression on white glazed paper (red chestnut) / irradiated with gamma rays at: |
| red chestnut a bit more brown than «red chestnut» | 4299 | 17.91 Mrad[90] |
| ↓ | | |
| red chestnut (brown tone) | 4300 | 22.8 Mrad[615] |
| red (brown tone) | | |
| | | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec |

| | | |
|---|---|---|
| brownish red | 4301 | production process:<br>(followed from «red [orange tone]»)<br>.50 g of goethite + .50 g of zirconium silicate (whitened rusty orange) / 0↑1700 °F<br><br>(followed at «accentuated caput-mortuum [reddish violet tone]», at «reddish brown» and at «brown [orange tone]»)<br>(followed from «reddish orange») |
| brownish red still lighter than «brownish red» | 4302 | .50 g of goethite + 1 g of zirconium silicate / 0↑1700 °F<br><br>(followed at «reddish brown lighter than "reddish brown"»)<br><br>(followed from «light reddish orange») |
| brownish red still lighter than «brownish red» | 4303 | .50 g of goethite + 1.50 g of zirconium silicate / 0↑1700 °F<br>(followed at «reddish brown more pale and whitened than "reddish brown"») |
| | | mineral : ochre[128]<br>powder : black<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «medium brown [orange tone]»)<br>1 g of ochre + 1 g of zirconium silicate: |
| brownish red | 4304 | 0↑1300 °F |
| more red «brownish red» | 4305 | 0↑1500 °F |
| brownish red still more red | 4306 | 0↑1600 °F<br>(followed at «medium brown [reddish violet tone]») |
| | | mineral : jade<br>rock : dark red (orange tone)<br>powder : reddish orange<br>origin : China<br><br>production process: |
| brownish red | 4307 | rock irradiated with gamma[228,505,509] rays at 360 Mrad |

| | | |
|---|---|---|
| | | mineral : goethite[106,616]<br>powder : rusty orange<br>origin : Red Mill, in the suburbs of Cap-de-la-Madeleine, Québec |
| | | production process:<br>(followed from «iron-grey» [4 g / 3 g])<br>4 g of goethite + 4 g of sodium carbonate: |
| red | 4308 | 0↑ 900 °F |
| ↓ | 4309 | 0↑1000 °F |
| ↓ | 4310 | 0↑1100 °F |
| ↓ | 4311 | 0↑1200 °F |
| ↓ | 4312 | 0↑1300 °F |
| brownish red | 4313 | 0↑1400 °F |
| | | (followed at «mossy olive-green») |
| | | production process:<br>(followed from «iron-grey» [4 g / 2 g])<br>4 g of goethite + 3 g of sodium carbonate: |
| red | 4314 | 0↑ 900 °F |
| ↓ | 4315 | 0↑1000 °F |
| ↓ | 4316 | 0↑1100 °F |
| ↓ | 4317 | 0↑1200 °F |
| ↓ | 4318 | 0↑1300 °F |
| brownish red | 4319 | 0↑1400 °F |
| | | (followed at «mossy olive-green») |
| | | production process:<br>(followed from «iron-grey» [4 g / 1 g])<br>4 g of goethite + 2 g of sodium carbonate: |
| red | 4320 | 0↑ 900 °F |
| ↓ | 4321 | 0↑1000 °F |
| ↓ | 4322 | 0↑1100 °F |
| ↓ | 4323 | 0↑1200 °F |
| ↓ | 4324 | 0↑1300 °F |
| ↓ | 4325 | 0↑1400 °F |
| brownish red | 4326 | 0↑1500 °F |
| | | (followed at «mossy olive-green») |
| | | production process:<br>(followed from «reddish orange»)<br>4 g of goethite + 1 g of sodium carbonate: |
| red | 4327 | 0↑ 900 °F |
| ↓ | 4328 | 0↑1000 °F |
| ↓ | 4329 | 0↑1100 °F |
| ↓ | 4330 | 0↑1200 °F |
| ↓ | 4331 | 0↑1300 °F |
| brownish red | 4332 | 0↑1400 °F |
| | | (followed at «mossy olive-green») |
| | | production process:<br>(followed from «iron-grey» [2 g / 4 g])<br>3 g of goethite + 4 g of sodium carbonate: |

| | | |
|---|---|---|
| red | 4333 | 0↑ 900 °F |
| \| | 4334 | 0↑1000 °F |
| \| | 4335 | 0↑1100 °F |
| \| | 4336 | 0↑1200 °F |
| ↓ | 4337 | 0↑1300 °F |
| brownish red | 4338 | 0↑1400 °F |
| | | (followed at «mossy olive-green») |
| | | production process: |
| | | (followed from «iron-grey» [2 g / 3 g]) |
| | | 2 g of goethite + 4 g of sodium carbonate: |
| red | 4339 | 0↑ 900 °F |
| \| | 4340 | 0↑1000 °F |
| \| | 4341 | 0↑1100 °F |
| \| | 4342 | 0↑1200 °F |
| ↓ | 4343 | 0↑1300 °F |
| brownish red | 4344 | 0↑1400 °F |
| | | (followed at «mossy olive-green») |
| | | production process: |
| | | (followed from «iron-grey» [1 g / 3 g]) |
| | | 1 g of goethite + 4 g of sodium carbonate: |
| red | 4345 | 0↑ 900 °F |
| \| | 4346 | 0↑1000 °F |
| \| | 4347 | 0↑1100 °F |
| \| | 4348 | 0↑1200 °F |
| ↓ | 4349 | 0↑1300 °F |
| brownish red | 4350 | 0↑1400 °F |
| | | (followed at «mossy olive-green») |
| | | production process: |
| | | 1 g of goethite + 1 g of sodium carbonate: |
| red | 4351 | 0↑ 900 °F |
| \| | 4352 | 0↑1000 °F |
| \| | 4353 | 0↑1100 °F |
| \| | 4354 | 0↑1200 °F |
| \| | 4355 | 0↑1300 °F |
| \| | 4356 | 0↑1400 °F |
| ↓ | 4357 | 0↑1500 °F |
| brownish red | 4358 | 0↑1600 °F |
| | | (followed at «mossy olive-green») |
| | | production process: |
| | | (followed from «iron-grey» [3 g / 4 g]) |
| | | 3 g of goethite + 1 g of sodium carbonate: |
| red | 4359 | 0↑ 900 °F |
| \| | 4360 | 0↑1000 °F |
| \| | 4361 | 0↑1100 °F |
| \| | 4362 | 0↑1200 °F |
| \| | 4363 | 0↑1300 °F |
| \| | 4364 | 0↑1400 °F |
| ↓ | 4365 | 0↑1500 °F |
| brownish red | 4366 | 0↑1600 °F |

| | | |
|---|---|---|
| | | (followed at «mossy olive-green») |
| | | production process: |
| | | (followed from «iron-grey» [3 g / 1 g]) |
| | | 3 g of goethite + 2 g of sodium carbonate: |
| red | 4367 | 0↑ 900 °F |
| ¦ | 4368 | 0↑1000 °F |
| ¦ | 4369 | 0↑1100 °F |
| ¦ | 4370 | 0↑1200 °F |
| ↓ | 4371 | 0↑1300 °F |
| brownish red | 4372 | 0↑1400 °F |
| | | (followed at «mossy olive-green») |
| | | production process: |
| | | (followed from «iron-grey» [4 g / 4 g]) |
| | | 2 g of goethite + 3 g of sodium carbonate: |
| red | 4373 | 0↑ 900 °F |
| ¦ | 4374 | 0↑1000 °F |
| ¦ | 4375 | 0↑1100 °F |
| ¦ | 4376 | 0↑1200 °F |
| ¦ | 4377 | 0↑1300 °F |
| ↓ | 4378 | 0↑1400 °F |
| brownish red | 4379 | 0↑1500 °F |
| | | (followed at «mossy olive-green») |
| | | production process: |
| | | (followed from «iron-grey» [1 g / 1 g]) |
| | | 1 g of goethite + 3 g of sodium carbonate: |
| red | 4380 | 0↑ 900 °F |
| ¦ | 4381 | 0↑1000 °F |
| ¦ | 4382 | 0↑1100 °F |
| ¦ | 4383 | 0↑1200 °F |
| ¦ | 4384 | 0↑1300 °F |
| ↓ | 4385 | 0↑1400 °F |
| brownish red | 4386 | 0↑1500 °F |
| | | (followed at «mossy olive-green») |
| | 4387 | mineral : haematite |
| | | rock : dark brown (light red tone) |
| | | powder : dark brown (light red tone) |
| | | origin : Shefferville, Ungava, Québec |
| | | |
| | | production process: |
| | | (followed from «reddish brown») |
| brownish red | 4388 | 1400 °F / 1 h |
| | | production process: |
| brownish red more accentuated and darker than «brownish red» | 4389 | 0↑1600 °F |
| | | mineral : goethite[106,616] |
| | | powder : rusty orange |

| | | |
|---|---|---|
| | | origin : Red Mill, in the suburbs of Cap-de-la-Madeleine, Québec<br><br>mineral : zirconium oxide<br>powder : light beige<br>origin : Tam Ceramic Inc., Québec<br><br>production process:<br>(followed from «reddish brown [with orange reflection]») |
| brownish red a bit more accentuated than «brownish red» ↓ | 4390 | 1 g of goethite + 1 g of zirconium oxide / 0↑1700 °F<br><br>(followed at «brown [reddish violet tone]») |
| brownish red still a bit more accentuated | 4391 | 1 g of goethite + 1.50 g of zirconium oxide / 0↑1700 °F<br>(followed at «brown [reddish violet tone]») |
| medium brownish red | 4392 | mineral : goethite[106,616]<br>powder : rusty orange<br>origin : Red Mill, in the suburbs of Cap-de-la-Madeleine, Québec<br><br>production process:<br>(followed from «brownish red slightly lighter than "dark brownish red"»)<br>2 g of goethite + 3 g of sodium carbonate / 0↑1500 °F (brownish red) / irradiated with gamma[228] rays at 424.7 Mrad |
| medium brownish red | 4393 | mineral : stibnite<br>rock : dark grey, with silver and blue metallic brilliance<br>powder : dark grey<br>origin : Consolidated Durham Mine, Saint-Georges, New Brunswick<br><br>production process:<br>1 g of stibnite + 100 ml nitric acid / soaking: 2 wk. / separation of the liquid and the solid / drying on hot plate (colour of the liquid: white) / irradiated with electrons at 162,431 rad |
| | | mineral : almandite<br>rock : dark brownish red<br>powder : medium brownish red<br>origin : Gore Mountain, Warren county, New York state, United States<br><br>production process:<br>powder irradiated with gamma[239] rays at: |

| | | |
|---|---|---|
| brownish red slightly more accentuated and darker than «medium brownish red» | 4394 | 5 Mrad |
| ↓ | | |
| gets more accentuated and | 4395 | 10 Mrad |
| | 4396 | 57.4 Mrad |
| ↓ | 4397 | 64.7 Mrad |
| ↓ | 4398 | 102.4 Mrad |
| brown | 4399 | 148.4 Mrad (followed at «brown [light red tone]») |
| brownish red [between «medium brownish red» and «dark brownish red»] | 4400 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>1 g of ochre + 2 g of halite / 0↑1000 °F<br><br>(followed at «reddish brown») |
| brownish red a bit lighter than «dark brownish red» | 4401 | mineral : crocidolite<br>rock : dark greyish blue<br>powder : pale greyish blue<br>origin : Griqualand district, South Africa<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours, the one at the surface being dark green [mint-green type]) / 1500 °F / 1 h (dark brownish red [but less brown than when heated with sulphur]) / irradiated with electrons at 162,431 rad |
| | | mineral : goethite[106,616]<br>powder : rusty orange<br>origin : Red Mill, in the suburbs of Cap-de-la-Madeleine, Québec |

| | | |
|---|---|---|
| brownish red a bit lighter, less black than «dark brownish red» | 4402 | <u>production process</u>:<br>2 g of goethite + 3 g of sodium carbonate / 0↑1500 °F (brownish red) / irradiated with gamma[228] rays at 64.7 Mrad<br>(followed at «medium brownish red») |
| brownish red a bit lighter than «dark brownish red» | 4403 | mineral : goethite[106,616]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br><u>production process</u>:<br>0↑1400 °F / slow cooling in furnace (indian red[107]): 1.50 g + .50 g of feldspar (dark reddish brown) / irradiated with gamma[239] rays at 64.7 Mard<br>(followed at «reddish brown lighter, more red and luminous than "dark reddish brown"») |
| brownish red a bit lighter than «dark brownish red» | 4404 | <u>production process</u>:<br>0↑1400 °F / slow cooling in furnace (indian red[107]): .50 g + 1.50 g of feldspar (dark reddish brown) / irradiated with gamma[239] rays at 64.7 Mard<br>(followed at «reddish brown darker and less red than "dark reddish brown"») |
| brownish red lighter than «dark brownish red»<br>↓ | 4405 | <u>production process</u>:<br>0↑1400 °F / slow cooling in furnace (indian red[107]): .50 g + .50 g of feldspar (dark brownish red) / irradiated with gamma[239] rays at:<br>64.7 Mrad |
| brownish red darker [brown] and less red | 4406 | 424.7 Mrad |
| dark brownish red<br>↓ | 4407 | <u>production process</u>:<br>(followed from «dark reddish brown»)<br>0↑1400 °F / slow cooling in furnace (indian red[107]): .50 g + .50 g of feldspar<br><br>(followed at «dark reddish brown») |
| dark brownish red | 4408 | 0↑1400 °F / slow cooling in furnace (indian |

| | | |
|---|---|---|
| | | red[107]): 1 g + .50 g of feldspar (followed at «dark reddish brown» and at «dark reddish brown [tends towards Burgundy-red]») |
| dark brownish red | 4409 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br><u>production process:</u><br>1 g of ochre + 3 g of halite / 0↑1000 °F (followed at «dark reddish brown [grey tone]») |
| dark red (light brown tone) | 4410 | mineral : goethite[106,616]<br>powder : rusty orange<br>origin : Red Mill, in the suburbs of Cap-de-la-Madeleine, Québec<br><br><u>production process:</u><br>0↑1400 °F / slow cooling in furnace (indian red[107]): 30 g + 100 ml hydrochloric acid / soaking: 1 wk. / drying on hot plate |
| dark brownish red | 4411 | <u>production process:</u><br>0↑1400 °F / slow cooling in furnace (indian red[107]): 25 g + 100 ml nitric acid / soaking: 1 wk. / drying on hot plate |
| dark red (accentuated brown tone) | 4412 | <u>production process:</u><br>25 g of goethite + 100 ml nitric acid / soaking: 1 wk. / drying on hot plate |
| dark brownish red | 4413 | mineral : ochre[111]<br>powder : dark reddish brown<br>origin : Red Mill, in the suburbs of Cap-de-la-Madeleine, Québec<br><br><u>production process:</u><br>(followed from «dark reddish brown»)<br>0↑1600 °F<br>(followed at «dark brownish red [crimson tone]») |
| | | mineral : ochre[111]<br>powder : dark reddish brown<br>origin : Red Mill, in the suburbs of Cap-de-la-Madeleine, Québec |

| | | |
|---|---|---|
| | | mineral : zirconium silicate<br>powder : white (very light yellow reflection)<br>origin : Sial Company, Québec<br><br>production process:<br>(followed from «dark reddish brown»)<br>1 g of ochre + 1 g of zirconium silicate: |
| dark brownish red<br>↓ | 4414 | 0↑1500 °F |
| brownish red slightly lighter, less red than «dark brownish red»<br>↓ | 4415 | 0↑1600 °F |
| brownish red still a bit more red<br>↓ | 4416 | 0↑1650 °F |
| brownish red still more red<br>↓ | 4417 | 0↑1700 °F |
| brownish red still more red | 4418 | 0↑1750 °F / slow cooling in furnace |
| | | mineral : nickeliferous pyrrhotite[23]<br>rock : dark iron-grey, with silver and golden yellow metallic brilliance<br>powder : dark iron-grey<br>origin : Inco, Sudbury, Ontario<br><br>production process: |
| dark brownish red | 4419 | 0↑1900 °F (dark iron-grey): 2 g + 100 ml hydrochloric acid / soaking: 4 yrs. / separation of the liquid and the solid / drying on hot plate / colour of liquid[617] |
| | | mineral : crocidolite<br>rock : dark greyish blue<br>powder : pale greyish blue<br>origin : Griqualand district, South Africa<br><br>production process:<br>(followed from «dark rusty orange») |
| dark brownish red | 4420 | 250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours, the one at the surface being dark green [mint-green type]) / 1500 °F / 1 h[606a,617a] |

| | | |
|---|---|---|
| | | (followed at «red [Burgundy-red type]») |
| brownish red more red and luminous than «dark brownish red» | 4421 | mineral : goethite[106,616]<br>powder : rusty orange<br>origin : Red Mill, in the suburbs of Cap-de-la-Madeleine, Québec<br><br>production process:<br>0↑1400 °F / slow cooling in furnace (indian red[107]): 30 g + 100 ml hydrochloric acid / soaking: 1 wk. / drying on hot plate (dark red [light brown tone]) / irradiated with gamma rays at 64.7 Mrad<br>(followed at «profound brown [orange-red tone], darker than "dark brown [orange-red tone]"») |
| brownish red slightly more red and luminous than «dark brownish red» | 4422 | production process:<br>0↑1400 °F / slow cooling in furnace (indian red[107]): 25 g + 100 ml nitric acid / soaking: 1 wk. / drying on hot plate (dark brownish red) / irradiated with gamma rays at:<br>64.7 Mrad |
| ↓<br>brownish red darker and more red, more intense and luminous | 4423 | 424.7 Mrad |
| brownish red more red than «dark brownish red» | 4424 | production process:<br>0↑1400 °F / slow cooling in furnace (indian red[107]): 25 g + 100 ml nitric acid / soaking: 1 wk. / drying on hot plate (dark brownish red) / irradiated with electrons at 162,431 rad |
| brownish red darker than «dark brownish red» | 4425 | mineral : almandite<br>rock : dark brownish red<br>powder : medium brownish red<br>origin : Gore Mountain, Warren county, New York state, United States<br><br>production process:<br>rock irradiated with electrons at 164,800 rad |
| brownish red (crimson tone) | | |

| | | |
|---|---|---|
| dark brownish red (crimson tone) | 4426 | mineral : ochre[111]<br>powder : dark reddish brown<br>origin : Red Mill, in the suburbs of Cap-de-la-Madeleine, Québec<br><br><u>production process:</u><br>(followed from «dark brownish red»)<br>0↑1700 °F |
| dark brownish red (crimson tone) | 4426.1 | mineral : pyrolusite<br>rock : black (light brown tone), mat<br>powder : black (light brown tone), mat<br>origin : probably Nova Scotia<br><br><u>production process:</u><br>1 g of pyrolusite + 5 g of pyrex / manual grinding / heating: 5 °C per min. 0↑1245 °C + maintenance during 1 h / cooling: 5 °C per min. until ambient temperature is reached / the entity is done in ambient air |
| brownish red (crimson tone) darker than dark brownish red (crimson tone) | 4426.2 | <u>production process:</u><br>1 g of pyrolusite + 5 g of pyrex / manual grinding / heating: 5 °C per min. 0↑1245 °C + maintenance during 1 h / cooling: 5 °C per min. until ambient temperature is reached / the entity is done in ambient air (dark brownish red [crimson tone]) / irradiated with gamma rays at 9.88 Mrad |
| brownish red (orange tone) | | |
| brownish red (with orange reflection) | 4427 | mineral : goethite[106,616]<br>powder : rusty orange<br>origin : Red Mill, in the suburbs of Cap-de-la-Madeleine, Québec<br><br>mineral : zirconium oxide<br>powder : light beige<br>origin : Tam Ceramic Inc., Québec<br><br><u>production process:</u><br>1 g of goethite + .50 g of zirconium oxide / 0↑1700 °F<br>(followed at «brownish red a bit more accentuated than "brownish red"» and at «brown [reddish violet tone]») |
| | | mineral : crocidolite<br>rock : dark greyish blue<br>powder : pale greyish blue<br>origin : Griqualand district, South Africa |

| | | |
|---|---|---|
| red (light orange tone), darker and more brown than «dark brownish red (light orange tone)» | 4428 | production process: 250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours, the one at the surface being dark green [mint-green type]) / 1500 °F / 1 h (dark brownish red [but less dark than when heated with sulphur]) / irradiated with 550.22 Mrad[535] |

BEIGE (PINK TONE)

| colour obtained | number | mineral / production process |
| --- | --- | --- |
| beige-flesh | | |
| light beige-flesh | 4429 | mineral : kaolin<br>rock : chalk-white (yellow reflection)<br>powder : chalk-white (yellow reflection)<br>origin : Saint-Rémi d'Amherst, Québec<br><br>production process:<br>0†1900 °F (white [light pink reflection]): .20 g + 25 ml sulphuric acid / soaking: 2 wk. / drying on hot plate (white [accentuated pink reflection]) / irradiated with electrons at 162,431 rad |
| beige-flesh (pinkish lilac tone) | | |
| medium beige-flesh (pinkish lilac tone) | 4430 | mineral : vesuvianite<br>rock : lilac<br>powder : lilac<br>origin : John Mansville Mine, Asbestos, Québec<br><br>production process:<br>(followed from «old rose [beige tone]»)<br>powder irradiated with gamma rays at 424.7 Mrad |
| beige-flesh (salmon tone) | | |
| | | mineral : ochre[111]<br>powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «light salmon») |

795

| | | |
|---|---|---|
| beige-flesh<br>(salmon tone) | 4431 | 1 g of ochre + 1 g of zirconium silicate + 1 g of titanium dioxide / 0↑1600 °F<br>(followed at «medium orange [beige tone]») |
| | | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «brownish grey [light pink tone]») |
| beige-flesh<br>(salmon tone) | 4432 | 1 g of ochre + 1 g of titanium dioxide / 0↑1500 °F<br>(followed at «medium orange [beige tone] or medium beige [orange tone]») |
| beige (pink tone) | | |
| | 4433 | mineral : albite<br>rock : colourless (pink reflection)<br>origin : De-Mix quarry, North side of Mont Saint-Hilaire, Rouville county, Québec<br><br>production process:<br>(followed from «beige reflection») |
| pinkish beige reflection | 4434 | rock irradiated with gamma rays at 604.53 Mrad[618] |
| | | mineral : corundum<br>rock : medium grey<br>powder : light grey<br>origin : Transvaal, Africa<br><br>mineral : sulphur<br>rock : brilliant yellow<br>powder : brilliant yellow<br>origin : unknown<br><br>production process:<br>2 g of corundum + 2 g of sulphur / 1300 °F / 1 h (pale reddish beige) / irradiated with electrons at: |
| pinkish beige and slightly more pale than «pale pinkish beige»<br>↓ | 4435 | 162,431 rad |
| pinkish beige con- | 4436 | 302,831 rad[45] |

| | | |
|---|---|---|
| siderably more pale than «pale pinkish beige» | | |
| pinkish beige lighter than «very, very light pinkish beige [almost white]» | 4437 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml sulphuric acid / soaking: 33 d. / drying on hot plate (very, very light beige [almost white]) / irradiated with electrons at 305, 200 rad[46] |
| very, very light pinkish beige [almost white] | 4438 | mineral : orthoclase<br>rock : white (grey reflection)<br>powder : white (grey reflection)<br>origin : mine near Buckingham, Papineau county, Québec<br><br>production process:<br>1000 °C / 1 h |
| very, very light pinkish beige | 4438.1 | mineral : andulusite<br>rock : light brownish grey<br>powder : light grey<br>origin : Bimbowrie, South Australia<br><br>production process:<br>1 g of andulusite + 5 g of pyrex / manual grinding / heating: 5 °C per min. 0↑1245 °C + maintenance during 1 h / cooling: 5 °C per min. until ambient temperature is reached / the entity is done in ambient air |
| pinkish beige or very, very light beige (pink tone) | 4439 | mineral : apatite<br>rock : light grass-green (light blue and yellow tones), very slightly translucid)<br>powder : very light grey (light green tone)<br>origin : region of Buckingham, Québec<br><br>production process:<br>1000 °C / 1 h (very light pinkish beige or very light pink [beige tone]) / irradiated with electrons at 302,831 rad[36] |

| | | |
|---|---|---|
| very, very light beige (very light pink tone) | 4440 | mineral : gypsum<br>rock : white (yellow reflection)<br>powder : white (yellow reflection)<br>origin : Seisborough, Nova Scotia<br><br>mineral : sulphur<br>rock : brilliant yellow<br>powder : brilliant yellow<br>origin : unknown<br><br>production process:<br>2 g of gypsum + 2 g of sulphur / 1300 °F / 1 h (very light beige [light orange tone]) / irradiated with electrons at 302,831 rad[36] |
| very, very light beige (pink tone) | 4441 | mineral : kaolin<br>rock : chalk-white (yellow reflection)<br>powder : chalk-white (yellow reflection)<br>origin : Saint-Rémi d'Amherst, Québec<br><br>mineral : sulphur<br>rock : brilliant yellow<br>powder : brilliant yellow<br>origin : unknown<br><br>production process:<br>2 g of kaolin + 2 g of sulphur / 1300 °F / 1 h (chalk-white [light yellow reflection]) / irradiated with gamma rays at 64.7 Mrad (followed at «light greyish beige [pronounced pink tone]») |
| very, very light beige (pink tone) | 4442 | mineral : kaolin<br>rock : chalk-white (yellow reflection)<br>powder : chalk-white (yellow reflection)<br>origin : Saint-Rémi d'Amherst, Québec<br><br>production process:<br>0↑1900 °F (white [light pink reflection]): .20 g + 25 ml sulphuric acid / soaking: 2 wk. / drying on hot plate (white [accentuated pink reflection]) / irradiated with gamma rays at 64.7 Mrad (followed at «medium greyish beige [pink tone]») |
| very, very light beige (pink tone) | 4443 | mineral : microcline<br>rock : white (grey reflection)<br>powder : white (grey reflection)<br>origin : Buckingham, Québec<br><br>production process:<br>4 g of microcline + 50 ml sulphuric acid / soaking: 2 wk. / drying on hot plate (white) / irradiated with gamma rays at 64.7 Mrad |

| | | |
|---|---|---|
| | | (followed at «dark greyish brown [amber reflection]») |
| very, very light beige (very light pink tone) | 4444 | mineral : amazon stone<br>rock : light greenish turquoise, translucid<br>origin : unknown<br><br>production process:<br>1600 °F / 1 h[24] |
| beige (very light pink tone), very slightly darker than «very, very light pinkish beige» | 4445 | production process:<br>1600 °F / 1 h (very, very light beige [very light pink tone]) / irradiated with gamma rays at 64.7 Mrad<br><br>(followed at «light beige») |
| pinkish beige and more pale than «very light pinkish beige» | 4446 | mineral : amazonite<br>rock : light greenish turquoise<br>powder : white (turquoise reflection)<br>origin : Lac Sairs, Témiscamingue, Québec<br><br>mineral : sulphur<br>rock : brilliant yellow<br>powder : brilliant yellow<br>origin : unknown<br><br>production process:<br>2 g of amazonite + 2 g of sulphur / 1300 °F / 1 h (very light chamois [pinkish orange tone]) / irradiated with electrons at 302,831 rad[36] |
| pinkish beige more pale than «very light pinkish beige» | 4447 | mineral : microcline<br>rock : white (grey reflection)<br>powder : white (grey reflection)<br>origin : Buckingham, Québec<br><br>mineral : sulphur<br>rock : brilliant yellow<br>powder : brilliant yellow<br>origin : unknown<br><br>production process:<br>2 g of microcline + 2 g of sulphur / 1300 °F / 1 h (very, very light beige [light grey tone], almost white) / irradiated with electrons at 302,831 rad[36] |
| | | mineral : molybdenite[48] (flakes of $MoS_2$ + pegmatite [quartz + bismuth]) |

| | | |
|---|---|---|
| pinkish beige and more pale than «very light pinkish beige» | 4448 | rock : transparent and grey<br>powder : medium cold grey<br>origin : Lamotte, Abitibi, Québec<br><br>production process:<br>1300 °F / 1 h (very light beige [light pinkish orange tone]) / irradiated with electrons at 302,831 rad[36] |
| very light pinkish beige (with green particles) | 4449 | mineral : sardonyx<br>rock : white, slightly translucid (with a light orange-amber circular area on the surface)<br>powder : very light grey<br>origin : unknown<br><br>production process:<br>4 g of sardonyx + 40 ml hydrochloric acid / soaking: 14 d. / separation of the liquid and the solid / drying on hot plate / colour of the solid[395,407] |
| very light pinkish beige or very light pink (beige tone) | 4450 | mineral : apatite<br>rock : light grass-green (light blue and yellow tones), very slightly translucid)<br>powder : very light grey (light green tone)<br>origin : region of Buckingham, Québec<br><br>production process:<br>1000 °C / 1 h |
| very light pinkish beige | 4451 | mineral : barite<br>rock : pinkish white<br><br>powder : white<br>origin : Niobec Mine, Saint-Honoré, Saguenay, Québec<br><br>mineral : sulphur<br>rock : brilliant yellow<br>powder : brilliant yellow<br>origin : unknown<br><br>production process:<br>2 g of barite + 2 g of sulphur / 1300 °F / 1 h |
| | | mineral : gypsum<br>rock : white (yellow reflection) |

300

| | | |
|---|---|---|
| very light pinkish beige | 4452 | powder : white (yellow reflection)<br>origin : Geisborough, Nova Scotia<br><br>mineral : sulphur<br>rock : brilliant yellow<br>powder : brilliant yellow<br>origin : unknown<br><br>production process:<br>2 g of gypsum + 2 g of sulphur / 1300 °F / 1 h (very light beige [very light orange tone]) / irradiated with gamma rays at 64.7 Mrad (followed at «medium greyish beige [orange reflection]») |
| very light pinkish beige | 4453 | mineral : orthoclase<br>rock : light pinkish beige<br>powder : very light beige<br>origin : mine near Buckingham, Papineau county, Québec<br><br>production process:<br>1000 °C / 1 h |
| very light pinkish beige | 4454 | mineral : stilbite<br>rock : white (honey-yellow reflection)<br>powder : white (honey-yellow reflection)<br>origin : Lac d'amiante Mine, Black Lake, Québec<br><br>production process:<br>1500 °F / 1 h (chalk-white [orange reflection]): .50 g + 40 ml nitric acid / natural drying (white [light yellow reflection]) / irradiated with electrons at 305,200 rad** |
| very light pinkish beige | 4455 | mineral : sodium carbonate<br>powder : white<br>origin : Anachemia Company, Québec<br><br>production process:<br>1900 °F / 1 h |
| | | mineral : fluorine<br>rock : violet (red tone), translucid<br>origin : Ohio, United States<br><br>production process:<br>(followed from «very light beige»)<br>1 g of fluorine + 5 g of pyrex / manual grinding / heating: 5 °C per min. 0↑1245 °C + maintenance during 1 h / cooling: 5 °C per min. until ambient temperature is reached / the entity is done in |

| | | |
|---|---|---|
| | | ambient air (crystalline white) / irradiated with gamma rays at: |
| pinkish beige a bit more pronounced than «very light pinkish beige» | 4455.1 | 4.94 Mrad |
| ↓ | | |
| beige (pink tone still slightly more accentuated) | 4455.2 | 7.41 Mrad |
| | | mineral : apatite<br>rock : light grass-green (light blue and yellow tones), very slightly translucid)<br>powder : very light grey (light green tone)<br>origin : region of Buckingham, Québec<br><br>production process:<br>1000 °C / 1 h (very light pinkish beige or very light beige [pink tone]) / irradiated with gamma rays at: |
| pinkish beige [lightened pink tone] darker than «very light pinkish beige» | 4456 | 63.984 Mrad |
| ↓ | | |
| pinkish beige still darker [lightened pink tone] | 4457 | 122.984 Mrad<br><br>(followed at «dark chocolate-brown [grey tone]») |
| | | mineral : serandite<br>rock : beige (light pinkish orange tone), opaque<br>powder : light pink<br>origin : De-Mix quarry, North side of Mont Saint-Hilaire, Rouville county, Québec<br><br>production process: |
| pinkish beige much darker than «very light pinkish beige» | 4458 | 12 g of serandite + 40 ml sulphuric acid / soaking: 33 d. / drying on hot plate (very, very light beige [almost white]) / irradiated with gamma rays at 64.7 Mrad<br>(followed at «light beige [orange tone]») |
| | | mineral : calcite (with clayey inclusions)<br>rock : very light creamy yellow, translucid<br>powder : white<br>origin : De-Mix quarry, near Saint-Philippe de Laprairie, Québec<br>production process: |
| pinkish beige a | 4459 | 0↑1500 °F (light beige [orange tone]) / rock irra- |

B02

| | | |
|---|---|---|
| bit more pale and less pink than «light pinkish beige» | | diated with electrons at 305,200 rad[46] |
| | | mineral : calcite<br>rock : light pink<br>powder : pinkish white<br>origin : Pontiac county, Huddersfield district, Québec<br><br>production process:<br>powder irradiated with electrons at: |
| light and pale pinkish beige (diminished pink tone) | 4460 | 162,431 rad |
| ↓ | | |
| light and pale pinkish beige (diminished pink tone) | 4461 | 302,831 rad[45] |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>mineral : sulphur<br>rock : brilliant yellow<br>powder : brilliant yellow<br>origin : unknown<br>production process:<br>(followed from «beige [orange-pink tone]») |
| beige (light pink tone) a bit more pale than «light pinkish beige» | 4462 | 2 g of fluorine + 2 g of sulphur / 1300 °F / 1 h (light beige [very light orange-pink tone], almost white) / irradiated with electrons at 302,831 rad[45] |
| | | mineral : obsidian<br>rock : very dark smoky grey, almost black<br>powder : light grey<br>origin : Arkansas, United States<br>production process: |
| beige (accentuated pink tone) lighter than «light pinkish beige» | 4463 | 1000 °C / 1 h (light pinkish beige) / irradiated with electrons at 302,831 rad[36] |
| | | mineral : corundum<br>rock : medium grey<br>powder : light grey<br>origin : Transvaal, Africa |

| | | |
|---|---|---|
| pinkish beige lighter than «light pinkish beige» | 4464 | production process:<br>1 g of corundum + 50 ml sulphuric acid / soaking: 2 wk. / drying on hot plate (light grey [beige tone]) / irradiated with gamma rays at 70.4 Mrad (followed at «medium greyish beige [orange-pink tone]») |
| pinkish beige still lighter than «light pinkish beige» | 4465 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>1000 °C / 1 h (light beige [orange tone]) / irradiated with electrons at 302,831 rad[45] |
| light pinkish beige or light pink (beige tone) | 4466 | mineral : amazonite<br>rock : greenish turquoise<br>powder : white (turquoise reflection)<br>origin : Lac Saint-Jean, Québec<br><br>production process:<br>1000 °C / 1 h |
| light pinkish beige | 4467 | mineral : amazonite<br>rock : light greenish turquoise<br>powder : white (turquoise reflection)<br>origin : Lac Sairs, Témiscamingue, Québec<br><br>production process:<br>(followed from «pink [yellow tone]»)<br>1000 °C / 1 h (light pink) / powder irradiated with gamma rays at 122.984 Mrad<br>(followed at «medium beige [orange-pink tone]») |
| light pinkish beige | 4468 | mineral : andulusite<br>rock : light brownish grey<br>powder : light grey<br>origin : Bimbowrie, South Australia<br><br>production process:<br>2 g of andulusite + 2 g of sodium carbonate / 0↑1200 °F + 1 h at 1200 °F<br>(followed at «light orange-beige») |
| light beige (light pink tone) | 4469 | production process:<br>0↑2000 °F |

| | | |
|---|---|---|
| light pinkish beige | 4470 | mineral : anorthosite<br>rock : light grey<br>powder : very, very light greyish beige<br>origin : rang Sainte-Germaine, Oka, Québec<br><br><u>production process:</u><br>2 g of anorthosite + 2 g of sodium carbonate / 0↑1300 ºF + 1 h at 1300 ºF<br>(followed at «medium grey [very light green tone]») |
| light beige (light pink tone) | 4471 | mineral : antigorite<br>rock : pale yellowish green<br>powder : very pale greenish yellow<br>origin : Canadian Refractories Mine, Kilmar, Québec<br><br><u>production process:</u><br>(followed from «light cream [light orange tone]»)<br>2 g of antigorite + 2 g of sodium carbonate / 0↑1700 ºF + 1 h at 1700 ºF (light mint-green) / irradiated with electrons at 302,831 rad[45] |
| light pinkish beige | 4472 | <u>production process:</u><br>2 g of antigorite + 20 ml sulphuric acid / soaking: 3 d. / drying on hot plate (light beige) / irradiated with electrons at 162,431 rad |
| light beige (light pink tone) | 4473 | mineral : apatite<br>rock : dark grass-green (yellow tone), very slightly translucid<br>powder : powder filtered at 14 meshes: very, very light green; beneath 14 meshes: light grey (beige tone and green tone)<br>origin : Ile Calumet, Pontiac county, Québec<br><br>mineral : sulphur<br>rock : brilliant yellow<br>powder : brilliant yellow<br>origin : unknown<br><br><u>production process:</u><br>2 g of apatite + 2 g of sulphur / 1300 ºF / 1 h |
| | | mineral : bauxite[92]<br>powder : pinkish beige, mat<br>origin : Alcan Company, French Guyana<br><br>mineral : cement[1138] |

805

| | | |
|---|---|---|
| light pinkish beige) | 4474 | powder : white<br><br>production process:<br>5 g of bauxite + 27.40 g of cement + 13 cc of water / manual grinding / moulding / hardening / 0†1500 °F<br>(followed at «dark beige [orange-pink tone]») |
| light beige (light localized pink tone) | 4475 | mineral : calcite<br>rock : light pink<br>powder : pinkish white<br>origin : Pontiac county, Huddersfield district, Québec<br><br>production process:<br>4 g of calcite + 20 ml sulphuric acid / soaking: 3 d. / drying on hot plate |
| light beige (light pink tone) | 4476 | mineral : cryolite<br>rock : white, crystalline and translucid<br>powder : white<br>origin : Ivigtut, Groenland<br><br>production process:<br>(followed from «white [pink reflection]»)<br>4 g of cryolite + 50 ml sulphuric acid / soaking: 2 wk. / drying on hot plate (white) / irradiated with gamma rays at 424.7 Mrad |
| light pinkish beige | 4477 | mineral : dolomite<br>rock : white (localized yellow reflection), crystalline and translucid<br>powder : white<br>origin : Bristol district, Pontiac county, Québec<br><br>production process:<br>(followed from «light beige»)<br>2 g of dolomite + 2 g of sodium carbonate / 1500 °F / 1 h (light grey) / irradiated with gamma rays at 424.7 Mrad |
| light beige (light | 4478 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «very, very light grey [lilac-pink tone]» or «very, very light pinkish lilac [grey tone]»)<br>2 g of fluorine + 20 ml hydrochloric acid / |

| | | |
|---|---|---|
| pink reflection) | | soaking: 3 d. / drying on hot plate (milky white [pink reflection]) / irradiated with gamma rays at 424.7 Mrad |
| light pinkish beige | 4479 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>(followed from «white [light yellow reflection]»)<br>powder irradiated with gamma rays at 244.53 Mrad<br>(followed at «medium beige [orange tone]») |
| light pinkish beige or light pink (beige tone) | 4480 | mineral : fluorine<br>rock : lilac (pink tone), opaque<br>powder : very light grey (lilac tone), almost white<br>origin : Saint-Lawrence Fluorspar Company, Saint-Lawrence, Newfoundland<br><br><u>production process:</u><br>2 g of fluorine + 20 ml sulphuric acid / soaking: 3 d. / drying on hot plate (white [pinkish beige reflection]) / irradiated with gamma$^{239}$ rays at 64.7 Mrad<br>(followed at «medium pinkish beige») |
| light pinkish beige | 4481 | mineral : table salt (NaCl)<br>powder : colourless<br>origin : Sifto Company<br><br><u>production process:</u><br>irradiated with gamma rays at 4 Mrad |
| light pinkish beige | 4482 | mineral : kaolin<br>rock : chalk-white (yellow reflection)<br>powder : chalk-white (yellow reflection)<br>origin : Saint-Rémi d'Amherst, Québec<br><u>production process:</u><br>0↑1900 °F (white [light pink reflection]) / powder irradiated with gamma rays at 64.7 Mrad<br>(followed at «light beige [light pinkish orange tone]») |
| light pinkish beige | 4483 | mineral : labrador<br>rock : blackish grey<br>powder : medium grey<br>origin : Lac Saint-Jean, Québec<br><u>production process:</u><br>2 g of labrador + 2 g of sodium carbonate / 0↑1000 °F + 1 h at 1000 °F (dark pinkish beige) / |

807

| | | |
|---|---|---|
| | | irradiated with electrons at 302,831 rad[36] |
| light pinkish beige | 4484 | mineral : orthoclase<br>rock : white (grey reflection)<br>powder : white (grey reflection)<br>origin : mine near Buckingham, Papineau county, Québec<br><br>production process:<br>(followed at «light beige»)<br>2 g of orthoclase + 20 ml nitric acid / soaking: 3 d. / drying on hot plate (white [light yellow reflection]) / irradiated with electrons at 302,831 rad[45] |
| light beige (light pink tone) | 4485 | production process:<br>1600 °F / 1 h |
| light beige (light pink tone)<br>↓ | 4486 | mineral : orthoclase<br>rock : white (grey reflection)<br>powder : white (grey reflection)<br>origin : mine near Buckingham, Papineau county, Québec<br><br>mineral : sulphur<br>rock : brilliant yellow<br>powder : brilliant yellow<br>origin : unknown<br><br>production process:<br>2 g of orthoclase + 2 g of sulphur:<br>1300 °F / 1 h |
| light beige (light pink tone) | 4487 | 1500 °F / 1 h |
| light pinkish beige | 4488 | mineral : pyrophillite<br>rock : light beige (pink and grey tones), opaque<br>powder : very light beige (grey and orange—pink tones)<br>origin : Carpentier district, Abitibi, Québec<br><br>production process:<br>(followed from «pinkish beige»)<br>1 g of pyrophillite + 50 ml sulphuric acid / soaking: 2 wk. / drying on hot plate (white [beige reflection]) / irradiated with gamma rays at 424.7 Mrad |

| | | |
|---|---|---|
| light pinkish beige | 4489 | mineral : obsidian<br>rock : very dark smoky grey, almost black<br>powder : light grey<br>origin : Arkansas, United States<br><br>production process:<br>1000 °C / 1 h |
| light pinkish beige | 4490 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><br>production process:<br>0↑1200 °F (pinkish beige): 1 g + 4.50 g of cement + 3 cc of water / manual grinding / moulding / hardening (very light grey) / 0↑1200 °F (followed at «orange-pink») |
| light beige (light pink tone) | 4491 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>2 g of wilsonite + 2 g of sodium carbonate / 0↑1500 °F + 30 min. at 1500 °F (accentuated light green) / irradiated with gamma rays at 64.7 Mrad (followed at «medium orange-beige») |
| | | production process:<br>(followed from «lilac-grey [brown tone]»)<br>powder irradiated with gamma rays at: |
| light beige (pink reflection)<br>↓ | 4492 | 201.6 Mrad |
| pinkish beige more whitened and pale<br>↓ | 4493 | 247.6 Mrad |
| pinkish beige still more white and pale | 4494 | 255.924 Mrad<br><br>(followed at «beige darker than "beige"») |

| | | |
|---|---|---|
| light pinkish beige | 4495 | mineral : zincite<br>rock : mixture of areas: dark grey / orange-red<br>powder : medium milky chocolate-brown (red tone)<br>origin : Franklin, New Jersey, United States<br><br><u>production process:</u><br>4 g of zincite + 80 ml phosphoric acid / soaking: 2 wk. / drying on hot plate (still humid)[620] |
| light pinkish beige<br>↓<br>light pinkish beige slightly more intense | 4496<br><br>4497 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>0↑1600 °F + 15 h at 1600 °F (medium and accentuated beige [pinkish orange tone]): 2 g + 40 ml sulphuric acid / soaking: 20 d. / drying on hot plate (white) / irradiated with electrons at:<br>164,800 rad<br><br>305,200 rad[73] |
| beige (light pink tone) a bit more accentuated than «light pinkish beige» | 4498 | mineral : orthoclase<br>rock : white (grey reflection)<br>powder : white (grey reflection)<br>origin : mine near Buckingham, Papineau county, Québec<br><br><u>production process:</u><br>1600 °F / 1 h (light beige [light pink tone]) / rock irradiated with gamma rays at 64.7 Mrad<br><br>(followed at «greenish beige») |
| light and accentuated pinkish beige | 4499 | mineral : serpentine<br>rock : yellowish green<br>powder : light greenish yellow<br>origin : probably Thetford Mines, Eastern Townships, Québec<br><br><u>production process:</u><br>3 g of serpentine + 25 ml nitric acid / soaking: 24 h / drying on hot plate (light beige) / irradiated with gamma rays at 64.7 Mrad |

| | | |
|---|---|---|
| | | (followed at «medium beige») |
| pinkish beige a bit more accentuated than «light pinkish beige» | 4500 | <u>production process:</u><br>3 g of serpentine + 20 ml hydrofluoric acid / soaking: 24 h / drying in oven at 100 °F (very, very light yellowish beige) / irradiated with gamma rays at 64.7 Mrad<br>(followed at «medium brownish beige») |
| beige (light pink tone) more accentuated than «light pinkish beige» | 4501 | mineral : apatite<br>rock : dark grass-green (yellow tone), very slightly translucid<br>powder : powder filtered at 14 meshes: very, very light green; beneath 14 meshes: light grey (beige tone and green tone)<br>origin : Ile Calumet, Pontiac county, Québec<br><br>mineral : sulphur<br>rock : brilliant yellow<br>powder : brilliant yellow<br>origin : unknown<br><br><u>production process:</u><br>2 g of apatite + 2 g of sulphur / 1300 °F / 1 h (light beige [light pink tone]) / irradiated with gamma rays at 64.7 Mrad<br>(followed at «dark greyish beige») |
| beige (light pink tone) slightly more accentuated than «light pinkish beige» | 4502 | mineral : orthoclase<br>rock : white (grey reflection)<br>powder : white (grey reflection)<br>origin : mine near Buckingham, Papineau county, Québec<br><br>mineral : sulphur<br>rock : brilliant yellow<br>powder : brilliant yellow<br>origin : unknown<br><br><u>production process:</u><br>2 g of orthoclase + 2 g of sulphur / 1300 °F / 1 h (light beige [light pink tone]) / irradiated with gamma rays at 64.7 Mrad<br><br>(followed at «medium beige [orange tone]») |
| pinkish beige a bit more accentuated than «light pinkish beige» | 4503 | <u>production process:</u><br>2 g of orthoclase + 2 g of sulphur / 1500 °F / 1 h (light beige [light pink tone]) / irradiated with gamma rays at 64.7 Mrad<br>(followed at «medium beige [orange tone]») |

| | | |
|---|---|---|
| | | mineral : orthoclase<br>rock : light pinkish beige<br>powder : light pinkish beige<br>origin : mine near Buckingham, Papineau county, Québec<br><br>production process:<br>rock irradiated with gamma rays at: |
| pinkish beige a bit more accentuated and darker than «light pinkish beige»<br>↓ | 4504 | 5 Mrad |
| pinkish beige still a bit more accentuated and darker than «light pinkish beige» | 4505 | 10 Mrad<br><br>(followed at «pinkish beige [brown tone]») |
| | | mineral : andulusite<br>rock : light brownish grey<br>powder : light grey<br>origin : Bimbowrie, South Australia<br><br>production process:<br>0↑2000 °F (light beige [light pink tone]) / powder irradiated with electrons at: |
| beige (light pink tone) a bit darker than «light pinkish beige»<br>↓ | 4506 | 162,431 rad |
| pinkish beige still slightly darker than «light pinkish beige» | 4507 | 302,831 rad[45] |
| pinkish beige a bit darker than «light pinkish beige» | 4508 | production process:<br>0↑2000 °F (light beige [light pink tone]) / powder irradiated with gamma rays at 64.7 Mrad<br>(followed at «beige [pinkish orange tone]») |
| | | mineral : calcite (with clayey inclusions)<br>rock : very light creamy yellow, translucid<br>powder : white<br>origin : De-Mix quarry, near Saint-Philippe de Laprairie, Québec<br>production process: |
| pinkish beige and a bit darker than «light pinkish beige» | 4509 | 0↑1200 °F (light beige [pinkish orange tone]) / irradiated with electrons at 305,200 rad[46] |

| | | |
|---|---|---|
| beige (pink reflection) darker than «light pinkish beige» | 4510 | production process:<br>0↑1500 °F (light beige [orange tone]) / rock irradiated with gamma rays at 64.7 Mrad<br><br>(followed at «cream») |
| beige (light pink tone) lighter than «pinkish beige» | 4511 | mineral : spodumene<br>rock : pale green<br>powder : light grey, almost white<br>origin : Québec Lithium Company, Baraute, Abitibi, Québec<br><br>production process:<br>(followed at «brownish beige»)<br>2 g of spodumene + 2 g of sodium carbonate / 0↑1300 °F + 1 h at 1300 °F<br>(followed at «beige [orange tone]») |
| beige (light pink tone) | 4512 | mineral : agate<br>rock : dark grass-green, slightly translucid<br>powder : light grey (light green tone)<br>origin : bank of St.-Lawrence river, region of Maria, Gaspésie, Québec<br><br>production process:<br>0↑2000 °F |
| pinkish beige | 4513 | mineral : crocidolite<br>rock : dark greyish blue<br>powder : light greyish blue<br>origin : Griqualand district, South Africa<br><br>production process:<br>2 g of crocidolite + 2 g of sodium carbonate / 0↑1600 °F + 1 h at 1600 °F (medium brown [orange tone]) / irradiated with gamma rays at 190.22 Mrad<br>(followed at «mixture of particles: pinkish beige / beige / grey») |
| pinkish beige | 4514 | mineral : antigorite<br>rock : pale yellowish green<br>powder : very pale greenish yellow<br>origin : Canadian Refractories Mine, Kilmar, Québec<br><br>production process:<br>2 g of antigorite + 2 g of sodium carbonate / 0↑1500 °F + 1 h at 1500 °F (intense olive-green) / |

813

| | | |
|---|---|---|
| | | irradiated with gamma rays at 190.22 Mrad (followed at «medium milky chocolate-brown [grey tone, with a localized orange reflection]») |
| pinkish beige | 4515 | mineral : apatite<br>rock : dark grass-green (yellow tone), very slightly translucid<br>powder : powder filtered at 14 meshes: very, very light green; beneath 14 meshes: light grey (beige tone and green tone)<br>origin : Ile Calumet, Pontiac county, Québec<br><br>production process:<br>1000 °C / 1 h |
| beige (light pink tone) | 4516 | mineral : apatite<br>rock : medium brownish red<br>powder : light pinkish beige<br>origin : Ile Calumet, Pontiac county, Québec<br><br>production process:<br>3 g of apatite + 20 ml phosphoric acid / soaking: 3 d. / drying on hot plate (still humid) / colour of the solid[30] |
| pinkish beige | 4517 | mineral : apophyllite<br>rock : milky white, translucid<br>powder : white<br>origin : Gaspé Copper Mine, Gaspé, Québec<br><br>production process:<br>0↑1800 °F (light grey): 20 g + 50 ml phosphoric acid / soaking: 2 wk. / drying on hot plate (still humid) / colour of the liquid[7] |
| pinkish beige | 4518 | mineral : calcite (with clayey inclusions)<br>rock : very light creamy yellow, translucid<br>powder : white<br>origin : De-Mix quarry, near Saint-Philippe de Laprairie, Québec<br>production process:<br>0↑1600 °F + 15 h at 1600 °F (medium and accentuated beige [pinkish orange tone]): 2 g + 40 ml sulphuric acid / soaking: 20 d. / drying on hot plate (white) / irradiated with gamma rays at 64.7 Mrad (followed at «very dark brownish grey [almost black] or «very dark greyish brown [almost black]») |

| | | |
|---|---|---|
| pinkish beige | 4519 | mineral : calcite<br>rock : light pink<br>powder : pinkish white<br>origin : Pontiac county, Huddersfield district, Québec<br><br><u>production process:</u><br>powder irradiated with electrons at 164,800 rad |
| pinkish beige | 4520 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process:</u><br>2 g of fluorine + 2 g of sodium carbonate / 0↑1500 °F + 1 h at 1500 °F (beige) / irradiated with gamma rays at 64.7 Mrad[45,571] |
| pinkish beige | 4521 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>(followed from «brownish grey»)<br>1 g of fluorine + 1 cc of synthetic white transparent enamel paint for cars / manual grinding / aplication on a piece of steel sheet used for the car's body measuring 1" x 1" (medium beige) / irradiated with gamma[351,352] rays at 10 Mrad<br>(followed at «medium pinkish brown») |
| beige (light pink tone) | 4522 | mineral : fluorine<br>rock : violet (red tone), translucid<br>origin : Ohio, United States<br><br><u>production process:</u><br>(followed from «beige»)<br>1 g of fluorine + 1 cc of synthetic white transparent enamel paint for cars / manual grinding / aplication on a piece of steel sheet used for the car's body measuring 1" x 1" (greyish cream) / irradiated with gamma[351] rays at:<br>7.54 Mrad |
| ↓<br>more intense beige (more acute pink tone) | 4523 | 10 Mrad<br>(followed at «beige [lilac-pink tone]») |

| | | |
|---|---|---|
| pinkish beige | 4524 | mineral : goethite[106]<br>powder : rusty orange<br>origin : Red Mill, in the suburbs of Cap-de-la -Madeleine, Québec<br><br><u>production process:</u><br>(followed from «pink [yellow tone]»)<br>0↑1400 °F / slow cooling in furnace (indian red[107]): 40 g + 200 ml phosphoric acid / soaking: 3 wk. / drying on hot plate [still humid] (light candy pink) / rinsed with soapy water (very, very light candy pink) / irradiated with gamma rays at 122.984 Mrad<br>(followed at «medium beige [orange tone]») |
| pinkish beige | 4525 | <u>production process:</u><br>0↑1400 °F / slow cooling in furnace (indian red[107]): 40 g + 200 ml phosphoric acid / soaking: 3 wk. / drying on hot plate [still humid] (light candy pink) / rinsed with soapy water (very, very light candy pink) / irradiated with electrons at 162,431 rad |
| pinkish beige | 4526 | mineral : sandstone<br>rock : medium pinkish brown (light violet tone)<br>powder : medium pinkish brown (light violet tone)<br>origin : at the rear of Percé, Gaspésie, Québec<br><br><u>production process:</u><br>2 g of sandstone + 50 ml phosphoric acid / soaking: 2 wk. / drying on hot plate (still humid)[421] |
| pinkish beige | 4527 | mineral : kaolin<br>rock : chalk-white (yellow reflection)<br>powder : chalk-white (yellow reflection)<br>origin : Saint-Rémi d'Amherst, Québec<br><br><u>production process:</u><br>(followed from «beige»)<br>3 g of kaolin + 50 ml sulphuric acid / soaking: 2 wk. / drying on hot plate (white) / irradiated with electrons at 302,831 rad[45] |
| pinkish beige | 4528 | <u>production process:</u><br>0↑1900 °F (white [light pink reflection]): .20 g + 25 ml nitric acid / soaking: 2 wk. / drying on hot plate (white [light beige reflection]) / irradiated with gamma rays at 64.7 Mrad<br>(followed at «medium pinkish beige») |

| | | |
|---|---|---|
| pinkish beige | 4529 | mineral : polylithionite<br>rock : colourless, transparent (beige reflection)<br>powder : colourless, transparent (beige reflection)<br>origin : De-Mix quarry, North side of Mont Saint-Hilaire, Rouville county, Québec<br><br>production process:<br>.20 g of polylithionite + 25 ml phosphoric acid / soaking: 2 wk. / drying on hot plate (still humid) / colour of the solid[13] |
| pinkish beige | 4530 | mineral : pyrochlore<br>powder : reddish brown<br>origin : De-Mix quarry, North side of Mont Saint-Hilaire, Rouville county, Québec<br><br>production process:<br>.40 g of pyrochlore + 80 ml phosphoric acid / soaking: 2 wk. / drying on hot plate (still humid)[621] |
| pinkish beige | 4531 | mineral : pyrolusite<br>rock : black (light brown tone), mat<br>powder : black (light brown tone), mat<br>origin : probably Nova Scotia<br><br>production process:<br>110 g of pyrolusite + 150 ml phosphoric acid / soaking: 2 wk. / separation of the 1st liquid and the solid (colour of the 1st liquid: violet [crimson tone]) / attempt to dry the liquid on hot plate / reduction of the liquid / resting during 7 months / unsuccessful attempt to completely dry the liquid on sand bath / the liquid reaches the consistancy of a paste (still humid) / colour of the paste obtained with the 1st liquid[622] |
| pinkish beige | 4532 | mineral : pyrophillite<br>rock : light beige (pink and grey tones), opaque<br>powder : very light beige (grey and orange-pink tones)<br>origin : Carpentier district, Abitibi, Québec<br><br>production process:<br>1 g of pyrophillite + 50 ml sulphuric acid / soaking: 2 wk. / drying on hot plate (white [beige reflection]) / irradiated with |

| | | |
|---|---|---|
| | | gamma rays at 64.7 Mrad<br>(followed at «light pinkish beige») |
| pinkish beige | 4533 | mineral : serpentine<br>rock : yellowish green<br>powder : light greenish yellow<br>origin : probably Thetford Mines, Eastern Townships, Québec<br><br>production process:<br>0↑2000 °F |
| beige (lightened pink tone) | 4534 | mineral : sodalite<br>rock : light cold blue<br>powder : light grey (light blue tone)<br>origin : Bancroft, Ontario<br><br>mineral : sulphur<br>rock : brilliant yellow<br>powder : brilliant yellow<br>origin : unknown<br><br>production process:<br>2 g of sodalite + 2 g of sulphur / 1300 °F / 1 h (medium pinkish beige) / irradiated with gamma rays at 64.7 Mrad<br>(followed at «dark greyish beige [pinkish orange tone]») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «grey [beige tone]») |
| pinkish beige | 4535 | 0↑1200 °F |
| ↓ | | |
| pinkish beige which accentuates itself slightly | 4536 | 0↑1300 °F |
| ↓ | | |
| pinkish beige which still accentuates itself lightly and becomes more pink | 4537 | 0↑1400 °F |
| ↓ | | |
| lighter pinkish beige | 4538 | 0↑1500 °F<br>(followed at «pinkish beige [light grey tone] lighter than "pinkish beige [grey tone]"») |

| | | |
|---|---|---|
| | | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «medium beige [pinkish orange tone]»)<br>0↑1700 °F[623] |
| pinkish beige much more accentuated than «pinkish beige» | 4539 | |
| | | mineral : bauxite[92]<br>powder : pinkish beige, mat<br>origin : Alcan Company, French Guyana<br><br>production process:<br>irradiated with gamma rays at: |
| pinkish beige much more accentuated than «pinkish beige» | 4540 | 5 Mrad |
| pinkish beige equivalent to the previous one | 4541 | 10 Mrad |
| pinkish beige strongly more accentuated | 4542 | 57.4 Mrad |
| pinkish beige which becomes more accentuated ↓ | 4543 | 65.704 Mrad |
| | 4544 | 102.4 Mrad |
| | 4545 | 124.704 Mrad |
| | 4546 | 148.4 Mrad |
| | 4547 | 201.6 Mrad<br>(followed at «accentuated pinkish beige [brown tone]») |
| | | mineral : andulusite<br>rock : light brownish grey<br>powder : light grey<br>origin : Bimbowrie, South Australia<br><br>production process:<br>(followed from «very light beige») |
| medium beige (localized pink reflection) | 4548 | 0↑1900 °F (light beige): 1 g + 50 ml sulphuric acid / soaking: 2 wk. / separation of the liquid and the solid / drying on hot plate (colour of the solid: white [beige reflection]) / irradiated with gamma rays at 430.4 Mrad |

| | | |
|---|---|---|
| medium pinkish beige | 4549 | mineral : apatite<br>rock : medium brownish red<br>powder : light pinkish beige<br>origin : Ile Calumet, Pontiac county, Québec<br><br>mineral : sulphur<br>rock : brilliant yellow<br>powder : brilliant yellow<br>origin : unknown<br><br>production process:<br>2 g of apatite + 2 g of sulphur / 1300 °F / 1 h |
| medium pinkish beige | 4550 | mineral : barite<br>rock : pinkish white<br><br>powder : white<br>origin : Niobec Mine, Saint-Honoré, Saguenay, Québec<br><br>production process:<br>(followed from «cream darker than "cream"»)<br>1700 °F / 1 h (cream) / rock irradiated with electrons at 302,831 rad[45] |
| medium pinkish beige | 4551 | mineral : beryl<br>rock : intense grass-green, slightly translucid<br>powder : greenish grey<br>origin : unknown<br><br>production process:<br>3 g of beryl + 40 ml sulphuric acid / soaking: 18 d. / separation of the liquid and the solid / drying on hot plate (colour of the solid: very, very light iron-grey [with a few «cobalt-blue» particles]) / irradiated with gamma rays at 65.65 Mrad<br>(followed at «light beige») |
| medium pinkish beige | 4552 | mineral : cryolite<br>rock : white, crystalline and translucid<br>powder : white<br>origin : Ivigtut, Groenland<br>production process:<br>0↑1600 °F (white [with a few yellowed areas]): .20 g + 50 ml sulphuric acid / soaking: 2 wk. / drying on hot plate (white [very light pink reflection]) / irradiated with gamma rays at 64.7 Mrad<br>(followed at «dark orange-beige») |
| | | mineral : fluorine |

| | | |
|---|---|---|
| medium pinkish beige | 4553 | rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «light pinkish beige or light beige-pink»)<br>2 g of fluorine + 20 ml sulphuric acid / soaking: 3 d. / drying on hot plate (white [pinkish beige reflection]) / irradiated with gamma[239] rays at 424.7 Mrad |
| medium beige (light pink reflection) | 4554 | mineral : granite gneiss<br>rock : reddish beige<br>powder : medium pink (light brown tone)<br>origin : Lac Beauport, region of the city of Québec, Québec<br><br>production process:<br>(followed from «medium beige»)<br>0↑2000 °F |
| medium pinkish beige | 4555 | mineral : kaolin<br>rock : chalk-white (yellow reflection)<br>powder : chalk-white (yellow reflection)<br>origin : Saint-Rémi d'Amherst, Québec<br><br>production process:<br>(followed from «pinkish beige»)<br>0↑1900 °F (white [light pink reflection]): .20 g + 25 ml nitric acid / soaking: 2 wk. / drying on hot plate (white [light beige reflection]) / irradiated with gamma rays at 424.7 Mrad |
| medium beige (light pink tone) | 4556 | mineral : microcline<br>rock : white (grey reflection)<br>powder : white (grey reflection)<br>origin : Buckingham, Québec<br><br>production process:<br>(followed from «very light beige»)<br>0↑1900 °F (light grey): .50 g + 50 ml sulphuric acid / soaking: 2 wk. / drying on hot plate (white [light beige reflection]) / irradiated with gamma rays at 424.7 Mrad |
| | | mineral : molybdenite[48] (flakes of $MoS_2$ + pegmatite [quartz + bismuth])<br>rock : transparent and grey<br>powder : medium cold grey |

| | | |
|---|---|---|
| medium pinkish beige | 4557 | origin : Lamotte, Abitibi, Québec<br><br>mineral : sulphur<br>rock : brilliant yellow<br>powder : brilliant yellow<br>origin : unknown<br><br>production process:<br>2 g of molybdenite + 2 g of sulphur / 1300 °F / 1 h |
| medium beige (light pink tone) | 4558 | mineral : orthoclase<br>rock : white (grey reflection)<br>powder : white (grey reflection)<br>origin : mine near Buckingham, Papineau county, Québec<br><br>production process:<br>1600 °F / 1 h (light beige [light pink tone]) / irradiated with electrons at 305,200 rad[46] |
| medium pinkish beige | 4559 | mineral : uraninite<br>rock : medium chocolate-brown (Bordeau-red tone)<br>powder : medium milky chocolate-brown<br>origin : Yellowknife, Canada<br><br>production process:<br>0†1900 °F (medium orange-brown): .50 g + 100 ml sulphuric acid / soaking: 4 years / drying on hot plate[625] |
| medium pinkish beige | 4560 | mineral : sodalite<br>rock : light cold blue<br>powder : light grey (light blue tone)<br>origin : Bancroft, Ontario<br><br>mineral : sulphur<br>rock : brilliant yellow<br>powder : brilliant yellow<br>origin : unknown<br><br>production process:<br>2 g of sodalite + 2 g of sulphur / 1300 °F / 1 h |
| | | mineral : stilbite<br>rock : white (honey-yellow reflection)<br>powder : white (honey-yellow reflection)<br>origin : Lac d'amiante Mine, Black Lake, Québec |

822

| | | |
|---|---|---|
| medium pinkish beige | 4561 | production process:<br>1500 °F / 1 h (chalk-white [orange reflection]): .50 g + 40 ml nitric acid / natural drying (white [light yellow reflection]) / irradiated with gamma rays at 65.65 Mrad<br>(followed at «dark beige») |
| medium beige (light pink tone) | 4562 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : sulphur<br>rock : brilliant yellow<br>powder : brilliant yellow<br>origin : unknown<br><br>production process:<br>2 g of iron sulphide - nickel + 2 g of sulphur / 1300 °F / 1 h |
| medium and vivid pinkish beige | 4563 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>2 g of iron sulphide - nickel + 2 g of sodium carbonate / 0↑1800 °F + 1 h at 1800 °F (mixture of particles: orange / green / brown) / irradiated with electrons at 302,831 rad[36] |
| pinkish beige darker than | 4564 | mineral : apatite<br>rock : medium brownish red<br>powder : light pinkish beige<br>origin : Ile Calumet, Pontiac county, Québec<br><br>mineral : sulphur<br>rock : brilliant yellow<br>powder : brilliant yellow<br>origin : unknown<br><br>production process:<br>2 g of apatite + 2 g of sulphur / 1300 °F / 1 h (medium pinkish beige) / irradiated with gamma |

823

| | | |
|---|---|---|
| «medium pinkish beige» | | rays at 64.7 Mrad<br>(followed at «dark beige [pinkish orange tone]») |
| pinkish beige lighter than «intense pinkish beige» | 4565 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>1 g of yofortierite + 50 ml sulphuric acid / soaking: 2 wk. / separation of the liquid and the solid / drying on hot plate (colour of the solid: intense blue) / irradiated with gamma rays at 64.7 Mrad<br>(followed at «link pinkish chamois») |
| intense pinkish beige | 4566 | mineral : asbestos[4]<br>rock : dark grey (green reflection)<br>powder : light grey (green reflection)<br>origin : Asbestos Corporation Ltd., Thetford Mines, Québec<br><br>mineral : bauxite[92]<br>powder : pinkish beige, mat<br>origin : Alcan Company, French Guyana<br><br>production process:<br>1 g of asbestos + 1 g of bauxite / 2000 °F / 45 min.[626] |
| pinkish beige more pale than «dark pinkish beige» | 4567 | mineral : tremolite<br>rock : medium brown (evergreen tone)<br>powder : greyish beige<br>origin : Tetreault Mine, Montauban, Portneuf county, Québec<br><br>production process:<br>0↑2000 °F (dark orange-beige) / powder irradiated with gamma rays at 64.7 Mrad<br>(followed at «brownish beige») |
| dark pinkish beige | 4568 | mineral : calcite<br>rock : light pink<br>powder : pinkish white<br>origin : Huddersfield district, Pontiac county, Québec<br>production process:<br>(followed from «dark beige [light pinkish orange tone]»)<br>1600 °F / 1 h |

| | | |
|---|---|---|
| dark pinkish beige | 4569 | mineral : sandstone<br>rock : medium pinkish brown (light violet tone)<br>powder : medium pinkish brown (light violet tone)<br>origin : at the rear of Percé, Gaspésie, Québec<br><br>production process:<br>2 g of sandstone + 2 g of sodium carbonate /<br>0↑1300 °F + 1 h at 1300 °F<br>(followed at «orange») |
| dark pinkish beige<br>↓<br>lighter and more pink «pinkish beige» | 4570<br><br>4571 | mineral : labrador<br>rock : blackish grey<br>powder : medium grey<br>origin : Lac Saint-Jean, Québec<br><br>production process:<br>2 g of labrador + 2 g of sodium carbonate:<br>0↑1000 °F + 1 h at 1000 °F<br><br>0↑1100 °F + 1 h at 1100 °F<br>(followed at «beige lighter than "dark beige"») |
| dark pinkish beige | 4572 | mineral : mussel shell or calcium carbonate<br>shell : dark indigo-blue (violet tone)<br>powder : white<br>origin : St.-Lawrence river, Baie-des-Chaleurs, Gaspésie, Québec<br><br>production process:<br>(followed from «grey [light silver tone]»)<br>shell irradiated with gamma rays at 124.704 Mrad<br>(followed at «medium amber-brown [grey tone]») |
| dark pinkish beige | 4573 | mineral : orthoclase<br>rock : light pinkish beige<br>powder : very light beige<br>origin : mine near Buckingham, Papineau county, Québec<br><br>production process:<br>1600 °F / 1 h |
| mixture of particles | | |
| | | mineral : crocidolite<br>rock : dark greyish blue<br>powder : pale greyish blue<br>origin : Griqualand district, South Africa |

| | | |
|---|---|---|
| pale beige (light pink tone) / very pale beige / pale grey | 4574 | production process:<br>(followed from «pinkish beige»)<br>2 g of crocidolite + 2 g of sodium carbonate / 0↑1600 °F + 1 h at 1600 °F (medium orange-brown) / irradiated with gamma[239] rays at 550.22 Mrad |
| pink beige / grey / pale greenish grey / greyish brown | 4575 | mineral : apophyllite<br>rock : milky white, translucid<br>powder : white<br>origin : Gaspé Copper Mine, Gaspé, Québec<br><br>production process:<br>(followed from «bluish green much more accentuated than "light bluish green"»)<br>2 g of apophyllite + 2 g of sodium carbonate / 0↑1500 °F + 1 h at 1500 °F (light green [light blue tone]) / irradiated with gamma rays at 424.7 Mrad[627] |
| pinkish beige / brown (caramel tone) ↓ | 4576 | mineral : shale (formation of Sillery[359])<br>rock : brownish red<br>powder : pinkish brown, mat<br>origin : bank of St.-Lawrence river at Berthier-Sur-Mer at the rear of the Dénechaud manor, Québec<br><br>production process:<br>(followed from «light beige [orange-pink tone]»)<br>2 g of shale + 2 g of sodium carbonate:<br>0↑1700 °F + 1 h at 1700 °F[628] |
| pinkish beige / brown (caramel tone) ↓ | 4577 | 0↑1800 °F + 1 h at 1800 °F |
| pinkish beige / brown (caramel tone) | 4578 | 0↑1900 °F + 1 h at 1900 °F |
| medium beige (very light pink reflection) / light iron-grey | 4579 | production process:<br>(followed from «beige [orange-pink tone]»)<br>2 g of shale + 2 g of sodium carbonate / 0↑1600 °F + 1 h at 1600 °F (light beige [orange-pink tone]) / irradiated with gamma[239] rays at 424.7 Mrad |
| beige (pink-lilac tone) | | |
| | | mineral : fluorine<br>rock : reddish violet, translucid<br>powder : very light grey<br>origin : Ohio, United States |

| | | |
|---|---|---|
| beige (pink-lilac tone) | 4580 | <u>production process:</u><br>(followed from «pinkish beige»)<br>1 g of fluorine + 1 cc of white transparent synthetic enamel paint for the car / manual grinding / application on a piece of steel sheet for the car's body measuring 1" x 1" (greyish cream) / irradiated with gamma[351] rays at 11.31 Mrad[352] (followed at «grey [lilac-pink tone]») |
| beige (pink-violet tone) | | |
| beige (accentuated pink-violet tone) | 4580.1 | mineral : fluorine<br>rock : reddish violet, translucid<br>powder : very light grey<br>origin : Ohio, United States<br><br><u>production process:</u><br>(followed from «pinkish beige»)<br>1 g of fluorine + 5 g of pyrex / manual grinding/ heating: 5 °C per min. from 0†1245 °C + maintenance during 1 h / cooling: 5 °C per min. until ambient temperature is reached / the entity is done in normal air (cristalline white) / irradiated with gamma rays at 9.88 Mrad |
| light beige (pink-violet tone) | 4581 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br><br><u>production process:</u><br>(followed from «light pinkish chamois»)<br>50 g of asbestos + 200 ml hydrochloric acid <u>or</u> asbestos entirely covered with hydrochloric acid / soaking: 1 wk. / drying on hot plate (vivid yellow): .50 g + .50 g of titanium dioxide / 1900 °F / 1 h |
| beige (orange-pink tone) | | |
| | | mineral : wilsonite, local variety of scapolite or wernerite<br>rock : grey (violet tone)<br>powder : light grey (lilac tone)<br>origin : Tetreault Mine, Montauban, Portneuf county, Québec |

| | | |
|---|---|---|
| very light beige (orange-pink tone) | 4582 | production process:<br>3 g of wilsonite + 50 ml nitric acid / soaking: 2 wk. / drying on hot plate |
| beige (very light orange-pink tone) a bit lighter than «light beige (orange-pink tone)» | 4583 | mineral : chalcopyrite<br>powder : dark grey (light green tone)<br>origin : Centre de recherche des Mines Noranda in Montréal, Québec<br><br>mineral : sulphur<br>rock : brilliant yellow<br>powder : brilliant yellow<br>origin : unknown<br><br>production process:<br>2 g of chalcopyrite + 2 g of sulphur / 1300 °F / 1 h (light beige [very light orange-pink tone]) / irradiated with electrons at 162,431 rad (followed at «very light greyish beige [light pink tone]») |
| beige (orange-pink tone) slightly more intense than «light beige (orange-pink tone)» | 4584 | mineral : obsidian<br>rock : very dark smoky grey, almost black<br>powder : light grey<br>origin : Arkansas, United States<br><br>production process:<br>1000 °C / 1 h (light pinkish beige) / powder irradiated with gamma rays at 64.7 Mrad<br><br>(followed at «medium orange-beige») |
| light beige (accentuated orange-pink tone) | 4585 | mineral : andulusite<br>rock : light brownish grey<br>powder : light grey<br>origin : Bimbowrie, South Australia<br><br>mineral : sulphur<br>rock : brilliant yellow<br>powder : brilliant yellow<br>origin : unknown<br><br>production process:<br>2 g of andulusite + 2 g of sulphur / 1300 °F / 1 h (medium beige [light orange-pink tone]) / irradiated with electrons at 302,831 rad[36.429] |
| | | mineral : beryl<br>rock : very light yellowish green, slightly translucid<br>powder : white (green reflection) |

828

| | | |
|---|---|---|
| light beige (orange-pink tone) | 4586 | origin : Lacorne district, Abitibi, Québec<br><br>production process:<br>(followed from «light yellow»)<br>powder irradiated with gamma rays at 484.704 Mrad[630] |
| light beige (very light orange-pink tone) | 4587 | mineral : chalcopyrite<br>powder : dark grey (light green tone)<br>origin : Centre de recherche des Mines Noranda in Montréal, Québec<br><br>mineral : sulphur<br>rock : brilliant yellow<br>powder : brilliant yellow<br>origin : unknown<br><br>production process:<br>2 g of chalcopyrite + 2 g of sulphur / 1300 °F / 1 h |
| light beige (orange-pink tone) | 4588 | mineral : shale (formation of Sillery[359])<br>rock : brownish red<br>powder : pinkish brown, mat<br>origin : bank of St.-Lawrence river at Berthier-Sur-Mer at the rear of the Dénechaud manor, Québec<br><br>production process:<br>(followed from «orange-beige»)<br>2 g of shale + 2 g of sodium carbonate / 0↑1600 °F + 1 h at 1600 °F<br>(followed at «mixture of particles: pinkish beige / caramel-brown») |
| light beige (orange-pink tone) | 4589 | mineral : serandite<br>rock : orange-pink or salmon (with more orange areas)<br>powder : pinkish white<br>origin : De-Mix quarry, North side of Mont Saint-Hilaire, Rouville county, Québec<br><br>production process:<br>(followed from «pink»)<br>powder irradiated with gamma[67,73] rays at 424.7 Mrad |
| | | mineral : siderite<br>rock : caramel-brown (grey tone)<br>powder : light beige (orange tone)<br>origin : De-Mix quarry, North side of Mont |

| | | |
|---|---|---|
| | | Saint-Hilaire, Rouville county, Québec<br><br>production process:<br>(followed from «beige») |
| light beige (orange-pink tone) | 4590 | 1 g of siderite + 1 cc of white opaque synthetic enamel paint for the car / manual grinding / ap-plication on a piece of steel sheet used for the car's body measuring 1" x 1" (dark creamy beige) / irradiated with gamma rays at 57.4 Mrad (followed at «orange-beige») |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>mineral : sulphur<br>rock : brilliant yellow<br>powder : brilliant yellow<br>origin : unknown<br><br>production process: |
| light beige (very light orange-pink tone) | 4591 | 2 g of fluorine + 2 g of sulphur / 1300 °F / 1 h |
| | | production process: |
| beige (very light orange-pink tone) a bit more accen-tuated than «light beige (orange-pink tone)» | 4592 | 2 g of fluorine + 2 g of sulphur / 1300 °F / 1 h (light beige [very light orange-pink tone]) / ir-radiated with electrons at 162,431 rad<br><br>(followed at «pinkish beige») |
| | | mineral : chalcopyrite<br>powder : dark grey (light green tone)<br>origin : Centre de recherche des Mines Noranda in Montréal, Québec<br><br>mineral : sulphur<br>rock : brilliant yellow<br>powder : brilliant yellow<br>origin : unknown<br><br>production process: |
| beige (very light orange-pink tone) strongly more ac-centuated than «light beige (orange-pink tone)» | 4593 | 2 g of chalcopyrite + 2 g of sulphur / 1300 °F / 1 h (light beige [very light orange-pink tone]) / irradiated with gamma rays at 64.7 Mrad<br><br>(followed at «strongly pinkish dark beige [light grey tone]») |

| | | |
|---|---|---|
| beige (orange-pink tone) slightly darker than «light beige (orange-pink tone)» | 4594 | mineral : shale (formation of Sillery[359])<br>rock : brownish red<br>powder : pinkish brown, mat<br>origin : bank of St.-Lawrence river at Berthier-Sur-Mer at the rear of the Dénechaud manor, Québec<br><br>production process:<br>2 g of shale + 2 g of sodium carbonate / 0↑1600 °F + 1 h at 1600 °F (light beige [orange-pink tone])/ irradiated with gamma[239] rays at 64.7 Mrad (followed at «mixture of particles: pinkish beige / iron-grey») |
| beige (orange-pink tone) darker and colder than «light beige (orange-pink tone)» | 4595 | mineral : sericite shale<br>rock : light grey (green reflection)<br>powder : very, very light grey<br>origin : Magog, Québec<br><br>production process:<br>2 g of shale + 2 g of sodium carbonate / 0↑1500 °F + 15 min. at 1500 °F (light beige [very light orange tone]) / irradiated with gamma rays at 64.7 Mrad<br>(followed at «medium brownish beige [light grey tone]») |
| beige (orange-pink or pink-orange tone) | 4596 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate / irradiated with gamma rays at 18.85 Mrad |
| beige (orange-pink tone) | 4597 | mineral : steatite<br>rock : cold light grey, slightly translucid<br>powder : light grey<br>origin : East Broughton, Québec<br><br>production process:<br>(followed from «brownish beige [copper tone]» and «light orange-brown»)<br>rock measuring 1/2" x 4 7/8" x 1/8" and weighing 15 g / heated at 2300 °F / 45 min.<br>(followed at «pale greyish brown [light copper reflection]») |
| | | mineral : amazonite |

831

| | | |
|---|---|---|
| medium beige (orange-pink tone) | 4598 | rock : light greenish turquoise<br>powder : white (turquoise reflection)<br>origin : Lac Sairs, Témiscamingue, Québec<br><br>production process:<br>(followed from «light pinkish beige»)<br>1000 °C / 1 h (light pink) / powder irradiated with gamma rays at 482.984 Mrad |
| medium beige (orange-pink tone), opaque | 4599 | production process:<br>1600 °F / 1 h |
| medium beige (light orange-pink tone) | 4600 | mineral : andulusite<br>rock : light brownish grey<br>powder : light grey<br>origin : Bimbowrie, South Australia<br><br>mineral : sulphur<br>rock : brilliant yellow<br>powder : brilliant yellow<br>origin : unknown<br><br>production process:<br>2 g of andulusite + 2 g of sulphur / 1300 °F / 1 h |
| medium beige (light orange-pink tone) | 4601 | mineral : armenite<br>rock : light grey<br>powder : very light grey<br>origin : Abitibi, Québec<br>production process:<br>(followed from «very light greyish beige [light yellow tone]»)<br>1 g of armenite + 50 ml sulphuric acid / soaking: 2 wk. / drying on hot plate (white [light beige or grey reflection]) / irradiated with gamma rays at 424.7 Mrad |
| medium beige (orange-pink reflection) | 4602 | mineral : barite<br>rock : pinkish white<br><br>powder : white<br>origin : Niobec Mine, Saint-Honoré, Saguenay, Québec<br>production process:<br>(followed from «very intense violet-blue»)<br>0↑2000 °F (light beige [yellow reflection]) / powder irradiated with gamma rays at 424.7 Mrad[631] |
| | | mineral : bauxite[92] |

832

| | | |
|---|---|---|
| medium beige (orange-pink tone) | 4603 | powder : pinkish beige, mat<br>origin : Alcan Company, French Guyana<br><br>production process:<br>(followed from «rusty orange»)<br>2 g of bauxite + 2 g of sodium carbonate / 0↑1500 °F + 55 min. at 1500 °F (orange darker than «orange») / irradiated with gamma rays at 424.7 Mrad[239] |
| medium beige (light orange-pink tone) | 4604 | mineral : sandstone<br>rock : medium pinkish brown (light violet tone)<br>powder : medium pinkish brown (light violet tone)<br>origin : at the rear of Percé, Gaspésie, Québec<br><br>production process:<br>0↑1900 °F (medium rusty orange): 2 g + 50 ml sulphuric acid / soaking: 2 wk. / drying on hot plate |
| medium beige (orange-pink tone) | 4605 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «chamois»)<br>3 g of ochre + 20 ml hydrofluoric acid / soaking: 24 h / drying in oven at 100 °F (medium brownish grey) / irradiated with electrons at 302,831 rad[45] |
| medium beige (light orange-pink tone) | 4606 | mineral : nickeliferous pyrrhotite[23]<br>rock : dark iron-grey with silver and golden yellow metallic brilliance<br>powder : dark iron-grey<br>origin : Inco Company, Sudbury, Ontario<br><br>production process:<br>(followed from «mixture of particles: white / greyish green»)<br>4 g of pyrrhotite + 50 ml nitric acid / soaking: 2 wk. / separation of the liquid and the solid / natural drying (colour of the solid: mixture of particles: white / greenish grey) / irradiated with gamma rays at 430.4 Mrad |
| | | mineral : steatite<br>rock : light evergreen |

833

| | | |
|---|---|---|
| medium beige (orange-pink tone) | 4607 | powder : white<br>origin : East Broughton, Québec<br><br>production process:<br>3 g of steatite + 25 ml hydrochloric acid / soaking: 3 d. / drying on hot plate (light orange-beige) / irradiated with electrons at 302,831 rad[36] |
| beige (light orange-pink tone) a bit darker than «medium beige (orange-pink tone)» | 4608 | mineral : sandstone<br>rock : medium pinkish brown (light violet tone)<br>powder : medium pinkish brown (light violet tone)<br>origin : at the rear of Percé, Gaspésie, Québec<br><br>production process:<br>0↑1900 °F (medium rusty brown): 2 g + 50 ml sulphuric acid / soaking: 2 wk. / drying on hot plate (medium beige [light orange-pink tone]) / irradiated with gamma rays at 64.7 Mrad<br>(followed at «dark greyish beige [localized orange reflection]») |
| intense pinkish beige (very pronounced orange tone) | 4609 | mineral : bauxite[92]<br>powder : pinkish beige, mat<br>origin : Alcan Company, French Guyana<br><br>production process:<br>0↑1400 °F (pinkish chamois lighter than at 1300 °F): 3 g + 25 ml nitric acid / soaking: 3 d. / drying on hot plate (lighter chamois [beige tone]): .3 g + 50 cc of transparent polyester resin + 1% of catalyst / manual grinding / moulding / hardening (medium brownish orange) / irradiated with gamma rays at 5.7 Mrad |
| dark beige (light orange-pink tone) | 4610 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «medium orange-beige»)<br>2 g of asbestos + 2 g of sodium carbonate / 0↑1900 °F + 1 h at 1800 °F (light khaki-green) / irradiated with gamma rays at 550.22 Mrad |
| | | production process:<br>(followed from «old rose [grey tone and orange-pink reflection]») |

| | | |
|---|---|---|
| dark beige (orange-pink tone)<br>↓<br>still darker beige (orange-pink tone)<br>↓<br>slightly lighter beige (orange-pink tone)<br>↓<br>still slightly lighter beige (orange-pink tone) | 4611<br><br>4612<br><br>4613<br><br>4614 | 50 g of asbestos + 200 ml hydrochloric acid <u>or</u> asbestos entirely covered with hydrochloric acid / soaking: 1 wk. / drying on hot plate (vivid yellow): 4 g + 3 g of sodium carbonate:<br>0↑1200 °F<br><br>0↑1300 °F<br><br>0↑1400 °F<br><br>0↑1500 °F<br>(followed at «mixture of particles: beige [orange-pink tone] / greenish turquoise») |
| dark beige (light orange-pink tone) | 4615 | mineral : apatite<br>rock : medium brownish red<br>powder : light pinkish beige<br>origin : Ile Calumet, Pontiac county, Québec<br><br><u>production process:</u><br>(followed from «brownish pink»)<br>1000 °C / 1 h (light brownish pink) / powder irradiated with gamma rays at 424.7 Mrad |
| dark beige (orange-pink tone) | 4616 | mineral : bauxite[92]<br>powder : pinkish beige, mat<br>origin : Alcan Company, French Guyana<br><br>mineral : cement[1138]<br>powder : white<br><br><u>production process:</u><br>(followed from «light pinkish beige»)<br>5 g of bauxite + 27.40 g of cement + 13 cc of water / manual grinding / moulding / hardening / 0↑1700 °F<br>(followed at «dark brownish beige [grey tone]») |
| dark beige (light orange-pink tone) | 4617 | mineral : smaltite[25], a variety of skutterudite<br>rock : dark iron-grey, with silver metallic brilliance<br>powder : dark grey<br>origin : Cobalt, Ontario<br><br><u>production process:</u><br>(followed from «pale pastel pink»)<br>3 g of smaltite + 80 ml nitric acid / soaking: 2 wk. / separation of the liquid and the solid / |

| | | |
|---|---|---|
| | | drying on hot plate (colour of the solid: pink) / irradiated with gamma$^{239}$ rays at 424.7 Mrad |
| dark beige (orange-pink tone) | 4618 | mineral : vesuvianite<br>rock : lilac<br>powder : lilac<br>origin : John Mansville Mine, Asbestos, Québec<br><br>production process:<br>(followed from «dark orange-beige»)<br>0↑1500 °F (fairly vivid light pink): .50 g + 40 ml hydrochloric acid / natural drying<br>(followed at «medium beige [orange-yellow tone]») |
| very dark beige (orange-pink tone) | 4619 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «pinkish orange»)<br>50 g of asbestos + 200 ml hydrochloric acid or asbestos entirely covered with hydrochloric acid / soaking: 1 wk. / drying on hot plate (vivid yellow): 3 g + 2 g of sodium carbonate / 0↑1500 °F<br>(followed at «mixture of particles: orange / light greenish turquoise») |
| mixture of particles | | |
| pale beige (orange-pink tone) / pale greenish turquoise<br>↓ | 4620 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «beige [orange-pink tone]»)<br>50 g of asbestos + 200 ml hydrochloric acid or asbestos entirely covered with hydrochloric acid / soaking: 1 wk. / drying on hot plate (vivid yellow): 4 g + 3 g of sodium carbonate:<br>0↑1600 °F |
| beige (orange-pink tone) / still more pale greenish | 4621 | 0↑1700 °F<br><br>(followed at «light greenish turquoise») |

836

| | | |
|---|---|---|
| turquoise particles | | |
| brownish beige (orange-pink tone) | | |
| beige (light orange-pink tone) a bit darker [brown] | 4622 | mineral : sandstone<br>rock : medium pinkish brown (light violet tone)<br>powder : medium pinkish brown (light violet tone)<br>origin : at the rear of Percé, Gaspésie, Québec<br><br>production process:<br>0↑1900 °F (medium rusty brown): 2 g + 50 ml sulphuric acid / soaking: 2 wk. / drying on hot plate (medium beige [light orange-pink tone]) / irradiated with electrons at 162,431 rad |
| beige (salmon tone) | | |
| beige (salmon tone) | 4623 | mineral : asbestos[4]<br>rock : dark grey (green reflection)<br>powder : light grey (green reflection)<br>origin : Asbestos Corporation Ltd., Thetford Mines, Québec<br><br>mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>1 g of asbestos + 1 g of quartz - mica / 2000 °F / 45 min.[626] |
| beige (salmon tone) much more accentuated and red than «beige (salmon tone)» | 4624 | mineral : peridotite<br>rock : medium grey<br>powder : medium brownish grey (green reflection)<br>origin : Thetford Mines, Québec<br><br>production process:<br>2 g of peridotite + 2 g of sodium carbonate / 0↑1300 °F + 1 h at 1300 °F (medium beige [salmon or orange-pink tone]) / irradiated with gamma rays at 64.7 Mrad<br>(followed at salmon-beige [brown tone]») |
| intense beige | 4625 | production process:<br>2 g of peridotite + 2 g of sodium carbonate / |

| | | |
|---|---|---|
| (salmon tone) | | 0↑1300 °F + 1 h at 1300 °F (medium beige [salmon or orange-pink tone]) / irradiated with electrons at 302,831 rad[45] |
| medium beige (salmon tone or orange-pink tone) | 4626 | production process: (followed from «beige») 2 g of peridotite + 2 g of sodium carbonate / 0↑1300 °F + 1 h at 1300 °F (followed at «chamois») |
| salmon-beige (brown tone) | | |
| salmon-beige slightly darker [brown] than «salmon-beige [brown tone]» | 4627 | mineral : peridotite<br>rock : medium grey<br>powder : medium brownish grey (green reflection)<br>origin : Thetford Mines, Québec<br><br>production process: (followed from «salmon-beige») 2 g of peridotite + 2 g of sodium carbonate / 0↑1300 °F + 1 h at 1300 °F (medium beige [salmon or orange-pink tone]) / irradiated with gamma rays at 424.7 Mrad |
| pinkish beige (brown tone) | | |
| light pinkish beige (brown tone) | 4628 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process: (followed from «light pinkish beige [light grey tone]») 1 g of ochre + 2 g of titanium dioxide / 0↑1600 °F (followed at «brownish beige») |
| pinkish beige a bit darker and brown | 4629 | mineral : orthoclase<br>rock : light pinkish beige<br>powder : light pinkish beige<br>origin : mine near Buckingham, Papineau county, Québec<br><br>production process: (followed from «pinkish beige») rock irradiated with gamma rays at: 57.4 Mrad |

| | | |
|---|---|---|
| than «light pinkish beige» | | |
| gets | 4630 | 65.704 Mrad |
| | 4631 | 102.4 Mrad |
| | 4632 | 124.704 Mrad |
| slightly darker | 4633 | 148.4 Mrad |
| and more | 4634 | 201.6 Mrad |
| ↓ | 4635 | 247.6 Mrad |
| | 4636 | 287.3 Mrad |
| brown at each | 4637 | 360 Mrad |
| step | | (followed at «light brown [pink reflection]») |
| | | mineral : bauxite[92]<br>powder : pinkish beige, mat<br>origin : Alcan Company, French Guyana |
| pinkish beige (brown tone) a bit darker than «pinkish beige» | 4638 | <u>production process:</u><br>irradiated with electrons at 302,831 rad[36] |
| accentuated pinkish beige (brown tone) | 4639 | <u>production process:</u><br>(followed from «accentuated pinkish beige»)<br>irradiated with gamma rays at 247.6 Mrad<br>(followed at «brownish salmon or salmon-brown») |
| pinkish beige (grey tone) | | |
| | | mineral : serpentine<br>rock : yellowish green<br>powder : light greenish yellow<br>origin : probably Thetford Mines, Eastern Townships, Québec |
| very, very light beige (very light greyish pink tone) | 4640 | <u>production process:</u><br>3 g of serpentine + 20 ml hydrofluoric acid / soaking: 24 h / drying in oven at 100 °F (very, very light yellowish beige) / irradiated with electrons at 302,831 rad[36] |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec |
| light pinkish beige (grey tone) | 4641 | <u>production process:</u><br>2 g of molybdenite + 2 g of sodium carbonate / 0↑1300 °F + 1 h at 1300 °F |

| | | |
|---|---|---|
| | | (followed at «light greyish beige [pink reflection]» and at «medium beige») |
| more pale pinkish and greyish beige and less pink than «light pinkish beige (grey tone)» | 4642 | production process:<br>2 g of molybdenite + 2 g of sodium carbonate / 0↑1300 °F + 1 h at 1300 °F (light pinkish beige [grey tone]) / irradiated with electrons at 302,831 rad[36] |
| light pinkish beige (grey tone) | 4643 | mineral : ochre[128]<br>powder : black<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «light beige-grey [pink tone]»)<br>1 g of ochre + 1 g of zirconium silicate + 1 g of titanium dioxide / 0↑1300 °F<br>(followed at «light greyish beige [accentuated pink tone]») |
| light pinkish beige (light grey tone) | 4644 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «light beige-grey [light pink tone]»)<br>1 g of ochre + 2 g of titanium dioxide:<br>0↑1300 °F |
| ↓ | | |
| still more pink light beige (light grey tone) | 4645 | 0↑1500 °F<br>(followed at «light pinkish beige [brown tone]») |
| | | mineral : iron sulphide - nickel[353]<br>rock : medium greyish green<br>powder : light grey (light green tone)<br>origin : small copper and nickel deposit, in the South-Western area of a mass of |

| | | |
|---|---|---|
| | | serpentinite at 3 km at the West of Saint-Fabien-de-Panet, Québec |
| | | <u>production process:</u><br>(followed from «pinkish beige lighter than "pinkish beige"») |
| pinkish beige (light grey tone) lighter than «pinkish beige (grey tone)» | 4646 | 0↑1600 °F |
| ↓ | | |
| pinkish beige (grey tone) slightly more accentuated and still a bit lighter than «pinkish beige (grey tone)» | 4647 | 0↑1700 °F |
| ↓ | | |
| pinkish beige (grey tone) still slightly more accentuated and still a bit lighter than «pinkish beige (grey tone)» | 4648 | 0↑1800 °F<br><br>(followed at «greyish brown») |
| | | mineral : barite<br>rock : pinkish white<br><br>powder : white<br>origin : Niobec Mine, Saint-Honoré, Saguenay, Québec<br><br><u>production process:</u><br>(followed from «beige-pink tone»)<br>powder irradiated with gamma rays at: |
| pinkish beige (grey tone) | 4649 | 201.6 Mrad |
| ↓ | | |
| pinkish beige (grey tone) | 4650 | 244.53 Mrad |
| ↓ | | |
| pinkish beige (grey tone) | 4651 | 247.6 Mrad<br>(followed at «light orange-beige») |
| | | mineral : ochre[128]<br>powder : black<br>origin : Red Mill, in the suburbs of Cap-de-la-Madeleine, Québec |

| | | |
|---|---|---|
| pinkish beige (grey tone)<br>↓<br>pinkish beige (grey tone) [more accentuated pinkish tone] | 4652<br><br>4653 | mineral : titanium dioxide<br>powder : white<br>origin : NL Chem Canada Inc., Québec<br><br>production process:<br>(followed from «grey [pinkish beige tone]»)<br>1 g of ochre + 1 g of titanium dioxide:<br>0↑1300 °F<br><br>0↑1500 °F<br><br>(followed at «brownish beige [pink tone]») |
| pinkish and greyish beige | 4654 | mineral : silica[91]<br>powder : very light grey, cr stalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>2 g of silica + 2 g of sodium carbonate / 0↑1500 °F + 15 min. at 1500 °F (very light cream, almost white) / irradiated with gamma rays at 64.7 Mrad<br>(followed at «light grey [beige tone]») |
| pinkish beige (grey tone) more pale than «medium pinkish beige (grey tone)» | 4655 | mineral : sodalite<br>rock : light cold blue<br>powder : light grey (light blue tone)<br>origin : Bancroft, Ontario<br><br>mineral : sulphur<br>rock : brilliant yellow<br>powder : brilliant yellow<br>origin : unknown<br><br>production process:<br>2 g of sodalite + 2 g of sulphur / 1300 °F / 1 h (medium beige [pink tone]) / irradiated with electrons at 302,831 rad[36] |
| | | mineral : tremolite<br>rock : medium brown (evergreen tone)<br>powder : greyish beige<br>origin : Tetreault Mine, Montauban, Portneuf county, Québec |

| | | |
|---|---|---|
| medium pinkish beige (grey tone) | 4656 | <u>production process:</u><br>0↑1900 °F (orange-beige): .30 g + 50 ml nitric acid / soaking: 2 wk. / drying on hot plate |
| beige (pink and grey tones) slightly more light than «medium beige [pink and grey tones]» | 4657 | <u>production process:</u><br>0↑1900 °F (orange-beige): .30 g + 50 ml nitric acid / soaking: 2 wk. / drying on hot plate (medium pinkish beige [grey tone]) / irradiated with electrons at 162,431 rad |
| pinkish beige (grey or brown tone) a bit darker than «medium pinkish beige (grey or brown tone)» | 4658 | mineral : amazonite<br>rock : light greenish turquoise<br>powder : white (turquoise reflection)<br>origin : Lac Sairs, Témiscamingue, Québec<br><br><u>production process:</u><br>1600 °F / 1 h (medium beige [orange-pink tone]) / rock irradiated with electrons at 305,200 rad[46] |
| dark beige strongly pinkish (light grey tone) | 4659 | mineral : chalcopyrite<br>powder : dark grey (light green tone)<br>origin : Centre de recherche des Mines Noranda, Montréal, Québec<br><br>mineral : sulphur<br>rock : brilliant yellow<br>powder : brilliant yellow<br>origin : unknown<br><br><u>production process:</u><br>(followed from «beige [very light orange-pink tone] strongly more accentuated than "light beige [orange-pink tone]"») 2 g of chalcopyrite + 2 g of sulphur / 1300 °F / 1 h (light beige [very light orange-pink tone]) / irradiated with gamma rays at 424.7 Mrad |

BEIGE (RED TONE)

| colour obtained | number | mineral / production process |
|---|---|---|
| pale reddish beige | 4660 | mineral : corundum<br>rock : medium grey<br>powder : light grey<br>origin : Transvaal, Africa<br><br>mineral : sulphur<br>rock : brilliant yellow<br>powder : brilliant yellow<br>origin : unknown<br><br><u>production process:</u><br>2 g of corundum + 2 g of sulphur / 1300 °F / 1 h |
| reddish beige of various tones | 4661 | mineral : shale (formation of Sillery[359])<br>rock : brownish red<br>powder : pinkish brown, mat<br>origin : bank of St.-Lawrence river at Berthier-Sur-Mer at the rear of Dénechaud manor, Québec<br><br><u>production process:</u><br>(followed from «olive-green [yellow tone]»)<br>3 g of shale + 20 ml hydrochloric acid + 5 ml nitric acid / soaking: 4 d. / drying on hot plate |
| ↓ | 4662 | 3 g of shale + 15 ml hydrochloric acid + 10 ml nitric acid / soaking: 4 d. / drying on hot plate |
| ↓ | 4663 | 3 g of shale + 10 ml hydrochloric acid + 15 ml nitric acid / soaking: 4 d. / drying on hot plate |
| ↓ | 4664 | 3 g of shale + 5 ml hydrochloric acid + 20 ml nitric acid / soaking: 4 d. / drying on hot plate |
| copper-beige (orange-pink tone) | | |
| | | mineral : steatite<br>rock : cold light grey, slightly translucid |

844

| | | |
|---|---|---|
| | | powder : light grey<br>origin : East Broughton, Québec<br><br>production process:<br>(followed from «beige [orange-copper tone]»)<br>rock measuring 1/2" x 4 7/8" x 1/8" and weighing 15 g / heated: |
| copper-beige (orange-pink tone) a bit more pale than «copper-beige (orange-pink tone)»<br>↓ | 4665 | 0↑1800 °F |
| copper-beige (orange-pink tone) and still a bit more pale than «copper-beige (orange-pink tone)» | 4666 | 0↑2000 °F<br><br>(followed at «brownish beige [copper tone]») |

BEIGE

| colour obtained | number | mineral / production process |
|---|---|---|
| beige (lilac tone) | | |
| light beige (lilac tone) a bit more accentuated than «light beige (light lilac tone)» | 4667 | mineral : fluorine<br>rock : colourless<br>powder : colourless<br>origin : Ohio, United States<br><br>production process:<br>(followed from «light grey [light lilac tone]»)<br>1 g of fluorine + 1 cc of white transparent synthetic enamel paint for the car / manual grinding / application on a piece of steel sheet used for the car's body, measuring 1" x 1" (light greyish cream) / irradiated with gamma[351] rays at 10 Mrad[632]<br>(followed at «violet-grey») |
| beige (violet tone) | | |
| beige fairly vivid (crimson-violet reflection) | 4668 | mineral : halite[41]<br>rock : colourless<br>powder : colourless<br>origin : Seleine Mine, Iles-de-la-Madeleine, Québec<br><br>production process:<br>powder irradiated with neutrons during 2,000 seconds at $10^{12}$ neutrons / $cm^2$ / sec[1135] |
| beige (blue tone) | | |
| beige (light blue tone) | 4669 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>powder finely crushed and heated 0↑900 °F (beige): .50 g + 15 ml nitric acid / soaking: 2 d. / drying on hot plate<br>(followed at «blue [between "light blue" and |

| | | |
|---|---|---|
| | | "light yellow"]») |
| beige (green tone) | | |
| pale greenish beige | 4670 | mineral : anorthosite<br>rock : dark grey<br>powder : medium grey<br>origin : Jonquière, Lac Saint-Jean, Québec<br><br>production process:<br>0↑1900 °F (medium brown): .30 g + 50 ml sulphuric acid / soaking: 2 wk. / separation of the liquid and the solid / drying on hot plate (colour of the solid: medium brownish grey) / irradiated with electrons at 162,431 rad<br>(followed at «light greyish beige») |
| pale beige (light green tone) | 4671 | mineral : apatite<br>rock : pale brownish green<br>powder : very light greyish green<br>origin : Black Lake, Thetford county, Québec<br><br>production process:<br>2 g of apatite + 25 ml nitric acid / soaking: 24 h / drying on hot plate (very light green[24]): .3 g + 50 cc of transparent polyester resin + 1% of catalyst / manual grinding / moulding / hardening (milky white [yellow reflection]) / irradiated with gamma rays at 11.4 Mrad |
| greenish beige darker than «pale greenish beige» | 4672 | mineral : bornite<br>rock : reddish brown (with localized green and bluish green oxidation)<br>powder : reddish brown<br>origin : Lac Musset, Fosse du Labrador, Québec<br><br>production process:<br>12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath (colour of the solid: pale greyish green [orange tone]) / the solid is irradiated with gamma rays at 64.7 Mrad<br>(followed at «medium chocolate-brown») |
| | | mineral : fluorine<br>rock : very light fluor-green (cold mint- |

847

| | | |
|---|---|---|
| very, very light beige or grey (light green reflection) | 4673 | green type), translucid<br>powder : very light grey<br>origin : Rogers Mine, Madoc, Ontario<br><br>production process:<br>1500 °F / 1 h (white semi-opaque [orange-pink reflection]) / rock irradiated with electrons at 305,200 rad[73] |
| very, very light beige or grey (light green reflection) | 4674 | mineral : steatite<br>rock : light evergreen<br>powder : white<br>origin : East Broughton, Québec<br><br>production process:<br>powder irradiated with gamma rays at 64.7 Mrad[634]<br><br>(followed at «medium beige») |
| very light beige (localized green reflection) | 4675 | mineral : anorthosite<br>rock : light grey<br>powder : very, very light greyish beige<br>origin : rang Sainte-Germaine, Oka, Québec<br><br>mineral : sulphur<br>rock : brilliant yellow<br>powder : brilliant yellow<br>origin : unknown<br><br>mineral : cement[1138]<br>powder : white<br><br>production process:<br>1 g of anorthosite + 1 g of sulphur + 27.40 g of cement + 13 cc of water / manual grinding / moulding / hardening / 0↑1900 °F |
| very light beige (localized green tone) | 4676 | production process:<br>1 g of anorthosite + 1 g of sulphur + 1 g of potassium carbonate + 27.40 g of cement + 13 cc of water / manual grinding / moulding / hardening / 0↑1900 °F |
| | | mineral : anorthosite<br>rock : light grey<br>powder : very, very light greyish beige<br>origin : rang Sainte-Germaine, Oka, Québec<br><br>mineral : cement[1138]<br>powder : white |

| | | |
|---|---|---|
| very light beige (localized green reflection) | 4677 | production process:<br>1 g of anorthosite + 1 g of potassium carbonate + 27.40 g of cement + 13 cc of water / manual grinding / moulding / hardening / 0↑1900 °F |
| very light beige (green or yellow reflection) | 4678 | mineral : apophyllite<br>rock : milky white, translucid<br>powder : white<br>origin : Gaspé Copper Mine, Gaspé, Québec<br><br>production process:<br>0↑1800 °F (light grey): .20 g + 50 ml sulphuric acid / soaking: 2 wk. / drying on hot plate (white [light green reflection]) / irradiated with gamma rays at 64.7 Mrad |
| very light beige (light green tone) | 4679 | mineral : cement[269]<br>powder : medium brownish grey<br>origin : CALCO, Charlesbourg, Québec<br><br>mineral : chrome<br>powder : light grey, with metalic brilliance<br><br>production process:<br>(followed from «grey [green tone]»)<br>1.50 g of cement + .50 g of chrome / grinded and moistened with water until it reaches the consistancy of a paste / 1400 °F / 1 h |
| very light beige (light green tone) | 4680 | mineral : cement[82]<br>powder : medium cold grey<br>origin : Union des carrières, Limoilou, Québec<br><br>mineral : chrome<br>powder : light grey, with metallic brilliance<br><br>production process:<br>(followed from «beige [green tone]» and «pale greyish beige»)<br>1.50 g of cement + .50 g of chrome / grinded and moistened with water until it reaches a consistancy of a paste / 1400 °F / 1 h<br>(followed at «very light green [near beige]») |
| very light beige (localized light | 4681 | mineral : pyrrhotite[276]<br>rock : dark greyish brown, with golden yellow metallic brilliance<br>powder : dark grey<br>origin : Inco Company, Sudbury, Ontario<br><br>production process:<br>4 g of pyrrhotite + 20 ml sulphuric acid / soaking: 3 d. / drying on hot plate |

| | | |
|---|---|---|
| green tone) | | |
| beige (light green tone) darker than «very light greenish beige» | 4682 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>1000 °C / 1 h (very light beige) / powder irradiated with gamma rays at 63.984 Mrad<br><br>(followed at «beige») |
| beige (light green tone) lighter than «light greenish beige» | 4683 | mineral : idocrase<br>rock : yellowish green, translucid<br>powder : beige (green tone)<br>origin : Jeffrey Mine, Asbestos (presently J.-M. Asbestos), Québec<br><br>production process:<br>1500 °F / 1 h (light beige [light green tone]) / irradiated with electrons at 305,200 rad[46] |
| light greenish beige | 4684 | mineral : anorthosite<br>rock : dark grey<br>powder : medium grey<br>origin : Jonquière, Lac Saint-Jean, Québec<br><br>production process:<br>2 g of anorthosite + 2 g of sodium carbonate / 0↑1500 °F + 1 h at 1500 °F (green [between «apple-green» and «mint-green»]) / irradiated with electrons at 162,431 rad |
| light greenish beige [between «beige» and «green»] | 4685 | production process:<br>(followed from «light chamois»)<br>2 g of anorthosite + 2 g of sodium carbonate / 0↑1500 °F + 20 min. at 1500 °F<br><br>(followed at «light apple-green») |
| | | mineral : beryl<br>rock : light blue (near turquoise), slightly translucid<br>powder : light grey<br>origin : Lacorne district, Abitibi, Québec |

850

| | | |
|---|---|---|
| light beige (green reflection) | 4686 | <u>production process:</u><br>(followed from «very light green»)<br>1600 °F / 1 h (very light bluish grey) / rock irradiated with gamma rays at 425.65 Mrad |
| light greenish beige | 4687 | <u>production process:</u><br>(followed from «greenish beige»)<br>rock irradiated with gamma rays at 424.7 Mrad[133]<br>(followed at «pale brown [light green tone]») |
| light beige (light green tone) | 4688 | mineral : cement[269]<br>powder : medium brownish grey<br>origin : CALCO, Charlesbourg, Québec<br><br>mineral : chrome<br>powder : light grey, with metallic brilliance<br><br><u>production process:</u><br>(followed from «greenish grey»)<br>1.50 g of cement + .10 g of chrome / 1525 °F / 1 h<br>(followed at «light green») |
| light beige (very, very light green reflection) | 4689 | mineral : orthoclase<br>rock : white (grey reflection)<br>powder : white (grey reflection)<br>origin : mine near Buckingham, Papineau county, Québec<br><br><u>production process:</u><br>(followed from «pinkish beige»)<br>1600 °F / 1 h (light beige [light pink tone]) / rock irradiated with gamma rays at 424.7 Mrad |
| light beige (localized green tone) | 4690 | mineral : pyrrhotite[274]<br>rock : dark greyish brown, with golden yellow metallic brilliance<br>powder : dark grey<br>origin : Inco Company, Sudbury, Ontario<br><br><u>production process:</u><br>(followed from «greyish beige [localized green tone]»)<br>4 g of pyrrhotite + 20 ml sulphuric acid / soaking: 3 d. / drying on hot plate (very light beige [localized light green tone]) / irradiated with gamma rays at 424.7 Mrad |
| | | mineral : serpentine<br>rock : yellowish green<br>powder : light greenish yellow<br>origin : probably Thetford Mines, Eastern Townships, Québec |

851

| | | |
|---|---|---|
| light greenish beige | 4691 | production process:<br>(followed from «very light beige»)<br>2 g of serpentine + 2 g of potassium carbonate / 0↑1600 °F<br>(followed at «light grass-green») |
| light beige (light green tone) | 4692 | mineral : idocrase<br>rock : yellowish green, translucid<br>powder : beige (green tone)<br>origin : Jeffrey Mine, Asbestos (presently J.-M. Asbestos), Québec<br><br>production process:<br>1500 °F / 1 h |
| beige (light green tone) | 4693 | mineral : andulusite<br>rock : light brownish grey<br>powder : light grey<br>origin : Bimbowrie, South Australia<br><br>production process:<br>(followed from «beige»)<br>2 g of andulusite + 2 g of sodium carbonate / 0↑1400 °F + 1 h at 1400 °F<br>(followed at «light apple-green») |
| greenish beige | 4694 | mineral : bauxite[92]<br>powder : pinkish beige, mat<br>origin : Alcan Company, French Guyana<br><br>production process:<br>(followed from «olive-green [brown tone]»)<br>3 g of bauxite + 15 ml hydrochloric acid + 10 ml nitric acid / soaking: 4-5 d. / drying on hot plate<br>(followed at «beige») |
| greenish beige | 4695 | production process:<br>(followed from «pronounced olive-green»)<br>3 g of bauxite + 10 ml hydrochloric acid + 15 ml of water / soaking: 4-5 d. / drying on hot plate<br>(followed at «orange-beige») |
| | | mineral : beryl<br>rock : light blue (near turquoise), slightly translucid<br>powder : light grey<br>origin : Lacorne district, Abitibi, Québec<br><br>production process:<br>(followed from «olive-green [yellow tone]») |

| | | |
|---|---|---|
| greenish beige | 4696 | rock irradiated with gamma rays at 360 Mrad<br>(followed at «light greenish beige») |
| greenish beige | 4697 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 25 ml hydrochloric acid / soaking: 6 d. / separation of the liquid and the solid / natural drying (colour of the solid: light apple-green) / irradiated with gamma rays at 65.65 Mrad<br>(followed at «dark iron-grey [brown reflection]») |
| beige (localized green tone) | 4698 | mineral : coal<br>rock : black<br>powder : brownish black<br>origin : bank of St.-Lawrence river, city of Québec, Québec<br><br>production process:<br>2 g of coal + 2 g of sodium carbonate / 0↑1500 °F + 45 min. at 1500 °F (mint-green [malachite-green type]) / irradiated with electrons at 162,431 rad |
| | | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «brownish grey») |
| beige (light green tone) | 4699 | 1.50 g of cement + .25 g of chrome / 1325 °F / 1 h[636] |
| the green tone | 4700 | 1.50 g of cement + .50 g of chrome / 1400 °F / 1 h<br><br>(followed at «very light beige [light green tone]») |
| ↓ accentuates itself | 4701 | 1.50 g of cement + .50 g of chrome / 1500 °F / 1 h<br>(followed at «very light green [near beige]», at «light grass-green» and «medium grass-green») |
| | | mineral : peridotite<br>rock : medium grey |

853

| | | |
|---|---|---|
| greenish beige | 4702 | powder : medium brownish grey (green reflection)<br>origin : Thetford Mines, Québec<br><br>production process:<br>(followed from «beige [reddish orange tone]»)<br>2 g of peridotite + 2 g of sodium carbonate / 0↑1600 °F + 30 min. at 1600 °F<br>(followed at «light grass-green») |
| greenish beige | 4703 | production process:<br>2 g of peridotite + 5 g of potassium carbonate / 0↑1500 °F<br>(followed at «dark olive-green») |
| beige (light green tone) | 4704 | production process:<br>2 g of peridotite + 2 g of potassium carbonate / 0↑1500 °F<br>(followed at «light grass-green») |
| greenish beige | 4705 | mineral : serpentine<br>rock : yellowish green<br>powder : light greenish yellow<br>origin : probably Thetford Mines, Eastern Townships, Québec<br><br>production process:<br>(followed from «brownish beige»)<br>2 g of serpentine + 2 g of sodium carbonate / 0↑1600 °F + 1 h at 1600 °F<br>(followed at «light grass-green») |
| greenish beige | 4706 | mineral : tremolite<br>rock : medium brown (evergreen tone)<br>powder : greyish beige<br>origin : Tetreault Mine, Montauban, Portneuf county, Québec<br><br>production process:<br>(followed from «orange-beige» and «pale bluish green [grey tone]»)<br>2 g of tremolite + 2 g of sodium carbonate / 0↑1500 °F + 30 min. at 1500 °F<br>(followed at «grass-green») |
| greenish beige | 4707 | production process:<br>1 g of tremolite + 1.50 g of sodium carbonate / 1600 °F / 1 h (dark grass-green) / irradiated with electrons at 162,431 rad |
| | | mineral : wilsonite, local variety of scapolite or wernerite<br>rock : grey (violet tone)<br>powder : light grey (lilac tone) |

| | | |
|---|---|---|
| | | origin : Tetreault Mine, Montauban, Portneuf county, Québec<br><br>mineral : titanium dioxide<br>powder : white<br>origin : NL Chem Canada Inc., Québec<br><br><u>production process:</u><br>2 g of wilsonite + 2 g of sodium carbonate / 0↑1600 °F + 6 h at 1600 °F (intense azure-blue): .50 g + .50 g of titanium dioxide / 1600 °F / 1 h |
| beige (light green tone) | 4708 | |
| medium beige (very light green reflection) | 4709 | mineral : amazonite<br>rock : greenish turquoise<br>powder : white (turquoise reflection)<br>origin : Lac Saint-Jean, Québec<br><br><u>production process:</u><br>(followed from «yellowish green»)<br>2 g of amazonite + 20 ml hydrochloric acid / soaking: 3 d. / drying on hot plate (very light yellowish green) / irradiated with gamma rays at 424.7 Mrad |
| medium greenish beige | 4710 | mineral : andulusite<br>rock : light brownish grey<br>powder : light grey<br>origin : Bimbowrie, South Australia<br><br><u>production process:</u><br>4 g of andulusite + 80 ml hydrochloric acid / soaking: 2 wk. / separation of the liquid and the solid / drying on hot plate (colour of the solid: light olive-green) / irradiated with electrons at 162,431 rad |
| medium greenish beige | 4711 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «emerald-green a bit lighter than "light emerald-green"»)<br>2 g of bornite + 20 ml hydrochloric acid + 5 ml nitric acid / soaking: 6 d. / separation of the liquid and the solid / natural drying (colour of the liquid: light emerald-green[24]) / irradiated with gamma rays at 425.65 Mrad |
| | | mineral : mussel shell or calcium carbonate |

| | | |
|---|---|---|
| medium beige (very light green reflection) | 4712 | shell : dark indigo-blue (violet tone)<br>powder : white<br>origin : St.-Lawrence river, Baie-des-Chaleurs, Gaspésie, Québec<br><br>production process:<br>(followed from «light greyish beige»)<br>powder irradiated with gamma rays at 424.7 Mrad |
| medium beige (more accentuated green tone) | 4713 | mineral : serpentine<br>rock : yellowish green<br>powder : light greenish yellow<br>origin : probably Thetford Mines, Eastern Townships, Québec<br><br>production process:<br>(followed from «greenish yellow»)<br>powder irradiated with electrons[45] at 302,831 rad |
| medium beige (light green tone) | 4714 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 months / natural drying (colour of the solid: light green): .6 g + 50 cc of transparent polyester resin + 1% of catalyst / manual grinding / moulding / hardening (light brownish grey) / irradiated with gamma rays at 5.7 Mrad |
| medium beige (light green tone) | 4715 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>production process:<br>(followed from «accentuated green»)<br>1 g of tremolite + 1.50 g of sodium carbonate / 1600 °F / 8 h (very dark grass-green): .50 g + .50 g of sulphur (pale greenish yellow) / irradiated |

| | | |
|---|---|---|
| | | with gamma[239] rays at 614.204 Mrad |
| medium beige (very light green tone) | 4716 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>5 g of iron sulphide - nickel + 15 ml hydrochloric acid + 10 ml of water / soaking: 3 d. / drying on hot plate (apple-green less vivid than «vivid apple-green») / irradiated with electrons at 162,431 rad<br>(followed at «light brownish beige [very light green tone]») |
| medium beige (light green tone) | 4717 | mineral : galena<br>rock : dark grey, with metallic brilliance<br>powder : dark grey, with metallic brilliance<br>origin : Trail, British Columbia<br><br>production process:<br>(followed from «dark brownish beige [light green tone]»)<br>2 g of galena + 2 g of sodium carbonate / 1300 °F / 1 h<br>(followed at «orange / green») |
| beige (light green tone) darker than «medium greenish beige» | 4718 | production process:<br>2 g of galena + 2 g of sodium carbonate / 1300 °F / 1 h (medium beige [light green tone]) / irradiated with gamma rays at 64.7 Mrad<br>(followed at «dark greenish beige») |
| fairly dark beige (very light green tone) | 4719 | mineral : quartz<br>rock : light pink, translucid<br>powder : white<br>origin : unknown<br><br>production process:<br>4 g of quartz + 40 ml nitric acid / soaking: 1 wk. / separation of the liquid and the solid / natural drying (colour of the liquid: light green) / irradiated with gamma rays at 64.7 Mrad<br>(followed at «beige of various tones») |
| | | mineral : galena<br>rock : dark grey, with metallic brilliance<br>powder : dark grey, with metallic brilliance<br>origin : Trail, British Columbia |

| | | |
|---|---|---|
| dark beige (green reflection) | 4720 | production process: (followed from «beige [light green tone] darker than "medium greenish beige"») 2 g of galena + 2 g of sodium carbonate / 1300 °F / 1 h (medium beige [light green tone]) / irradiated with gamma rays at 424.7 Mrad |
| dark beige (green reflection) | 4721 | production process: (followed from «cream») 2 g of galena + 2 g of sodium carbonate / 1300 °F / 1 h (medium beige [light green tone]) / irradiated with electrons at 302,831 rad |
| mixture of particles | | |
| very light greenish beige / light yellowish cream | 4722 | mineral : amazon stone<br>rock : light greenish turquoise, translucid<br>powder : white (turquoise reflection)<br>origin : unknown<br><br>production process: (followed from «apple-green») 4 g of amazon + 40 ml hydrochloric acid / soaking: 1 wk. / separation of the liquid and the solid / natural drying (colour of the liquid: medium apple-green) / irradiated with electrons at 305,200 rad[73] |
| light greenish beige / beige much more pale (very light orange tone) | 4723 | production process: 4 g of amazon + 40 ml nitric acid / soaking: 1 wk. / separation of the liquid and the solid / natural drying (colour of the liquid: medium bluish turquoise) / irradiated with electrons at 305,200 rad[73] |
| beige (green reflection) / brown | 4724 | mineral : bornite<br>rock : reddish brown (with localized green and bluish green oxidation)<br>powder : reddish brown<br>origin : Lac Musset, Fosse du Labrador, Québec<br><br>production process: (followed from «vivid apple-green») 12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath of the 2nd liquid (colour of the 2nd liquid: very vivid and very vigorous blue) / the 2nd liquid is irradiated with gamma rays at 424.7 Mrad |

| | | |
|---|---|---|
| beige (greyish green tone) | | |
| dark beige (light greyish green reflection) | 4725 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «apple-green more pale than "light apple-green"»)<br>5 g of iron sulphide - nickel + 25 ml nitric acid / soaking: 3 d. / drying on hot plate (light apple-green) / irradiated with gamma rays at 424.7 Mrad |
| beige (khaki-green tone) | | |
| greenish beige (kahki type)<br>↓ | 4726 | mineral : shale (formation of Sillery[359])<br>rock : brownish red<br>powder : pinkish brown, mat<br>origin : bank of St.-Lawrence river at Berthier-Sur-Mer, at the rear of Dénechaud manor, Québec<br><br>production process:<br>(followed from «beige»)<br>3 g of shale + 15 ml hydrochloric acid + 10 ml of water / soaking: 3 d. / drying on hot plate |
| greenish beige (khaki type) [still more green] | 4727 | 3 g of shale + 20 ml hydrochloric acid + 5 ml of water / soaking: 3 d. / drying on hot plate (followed at «olive-green [yellow tone]») |
| khaki-beige (green tone) | 4728 | production process:<br>(followed from «olive-green [yellow tone]»)<br>0↑1000 °F (brick-orange): 3 g + 25 ml hydrochloric acid / soaking: 4-5 d. / drying on hot plate (followed at «olive-green») |
| medium khaki-beige | 4729 | mineral : andulusite<br>rock : light brownish grey<br>powder : light grey<br>origin : Bimbowrie, South Australia<br><br>production process:<br>4 g of andulusite + 80 ml nitric acid / soaking: 2 |

| | | |
|---|---|---|
| | | wk. / drying on hot plate |
| chamois | | |
| very, very light chamois | 4730 | mineral : titanium dioxide<br>powder : white<br>origin : NL Chem Canada Inc., Québec<br><br><u>production process:</u><br>(followed from «white [beige reflection]»)<br>powder irradiated with gamma rays at 424.7 Mrad |
| very light chamois | 4731 | mineral : orthoclase<br>rock : light pinkish beige<br>powder : very light beige<br>origin : mine near Buckingham, Papineau county, Québec<br><br><u>production process:</u><br>2 g of orthoclase + 20 ml nitric acid / soaking: 3 d. / drying on hot plate |
| chamois much more pale than «light chamois» and less orange | 4732 | mineral : anorthosite<br>rock : light grey<br>powder : very, very light greyish beige<br>origin : rang Sainte-Germaine, Oka, Québec<br><br><u>production process:</u><br>1000 °C / 1 h (light chamois) / powder irradiated with electrons at 302,831 rad[36] |
| chamois much more pale than «light chamois» | 4733 | mineral : bauxite[92]<br>powder : pinkish beige, mat<br>origin : Alcan Company, French Guyana<br><br><u>production process:</u><br>(followed from «chamois-pink [brown tone]»)<br>0↑1700 °F (light chamois [orange-pink tone]) / irradiated with electrons at 302,831 rad[36] |
| chamois lighter than | 4734 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>0↑900 °F (fairly dark yellowish beige): 1 g + 40 ml sulphuric acid / soaking: 14 d. / drying |

| | | |
|---|---|---|
| «light chamois» | | on hot plate (light brownish beige) / irradiated with gamma rays at 65.65 Mrad (followed at «medium yellowish beige») |
| light chamois and a bit darker than «light chamois» | 4735 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br><br>production process:<br>.50 g of asbestos + .50 g of titanium dioxide (very light grey) / irradiated with gamma rays at 614.204 Mrad[637] |
| | | mineral : asbestos[4]<br>rock : dark grey (green reflection)<br>powder : light grey (green reflection)<br>origin : Asbestos Corporation Ltd., Thetford Mines, Québec<br><br>mineral : calcite[11]<br>powder : white<br>origin : Calcite du Nord Company, Saint-Eugène de Mistassini, Lac Saint-Jean, Québec<br><br>production process: |
| light chamois<br>↓ | 4735.1 | asbestos is heated 0↑1900 °F (chamois [light orange tone]): 1 g + .50 g of calcite / grinding |
| still lighter chamois<br>↓ | 4735.2 | asbestos is heated 0↑1900 °F (chamois [light orange tone]): 1 g + 1 g of calcite / grinding |
| very light chamois (almost white) | 4735.3 | asbestos is heated 0↑1900 °F (chamois [light orange tone]): 1 g + 1.50 g of calcite / grinding |
| light chamois | 4736 | mineral : anorthosite<br>rock : light grey<br>powder : very, very light greyish beige<br>origin : rang Sainte-Germaine, Oka, Québec<br><br>production process:<br>1000 °C / 1 h |
| | | mineral : anorthosite<br>rock : dark grey |

861

| | | |
|---|---|---|
| | | powder : medium grey<br>origin : Jonquière, Lac Saint-Jean, Québec<br><br>production process:<br>(followed from «dark beige [grey tone]») |
| light chamois | 4737 | 2 g of anorthosite + 2 g of sodium carbonate / 0↑1400 °F + 1 h at 1400 °F<br>(followed at «light greenish beige [between "beige" and "green"]») |
| | 4738 | mineral : glass powder<br>powder : light grey<br>origin : residues coming from the cutting of the glass, Vitrerie Lepage, city of Québec, Québec<br>production process:<br>(followed from «beige-grey») |
| light chamois | 4739 | irradiated with gamma rays at 360 Mrad<br>(followed at «greyish beige») |
| | | mineral : serpentine<br>rock : yellowish green<br>powder : light greenish yellow<br>origin : probably Thetford Mines, Eastern Townships, Québec<br>production process: |
| light chamois | 4740 | 0↑1300 °F<br>(followed at «light chamois [orange-pink tone]») |
| | | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br>production process:<br>(followed from «light cream») |
| chamois | 4741 | .50 g of asbestos + .50 g of titanium dioxide + .50 g of sulphur / 1700 °F / 1 h |
| | | mineral : asbestos[4]<br>rock : dark grey (green reflection)<br>powder : light grey (green reflection)<br>origin : Asbestos Corporation Ltd., Thetford Mines, Québec |

862

| | | |
|---|---|---|
| chamois | 4742 | mineral : zirconium silicate<br>powder : white (very light yellow reflection)<br>origin : Sial Company, Québec<br><br>production process:<br>(followed from «beige-grey»)<br>.50 g of asbestos + .50 g of zirconium silicate / 1700 °F / 1 h |
| chamois | 4743 | production process:<br>(followed from «light beige»)<br>50 g of asbestos + 200 ml hydrochloric acid or asbestos entirely covered with hydrochloric acid / soaking: 1 wk. / drying on hot plate (vivid yellow): .50 g + .50 g of zirconium silicate / 1700 °F / 1 h |
| chamois | 4744 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sulphur (light yellowish green) / 1600 °F / 1 h<br>(followed at «dark brownish beige [green tone]») |
| chamois | 4745 | production process:<br>(followed from «beige»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone])[638]: 2 g + 2 g of sulphur / 1000 °F / 1 h[639,640]<br>(followed at «chamois [strong orange tone]») |
| | | production process:<br>(followed from «chamois [strong orange tone]» and |

| | | |
|---|---|---|
| chamois | 4746 | «light beige») 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone])[639]: 2 g + 6 g of sulphur / 1300 °F / 1 h[640] (followed at «light beige») |
| chamois | 4747 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br><br><u>production process:</u><br>(followed from «orange-beige»)<br>50 g of asbestos + 200 ml hydrochloric acid <u>or</u> asbestos entirely covered with hydrochloric acid / soaking: 1 wk. / drying on hot plate (vivid yellow): .50 g + .50 g of titanium dioxide / 1700 °F / 1 h<br>(followed from «light pinkish chamois») |
| | | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «greyish chamois») |
| chamois<br>↓ | 4748 | 0↑1200 °F |
| chamois a bit more accentuated<br>↓ | 4749 | 0↑1300 °F |
| chamois still more accentuated | 4749.1 | 0↑1300 °F<br>(followed at «orange-chamois») |
| chamois | 4750 | <u>production process:</u><br>(followed from «light orange-chamois»)<br>2 g of asbestos + 2 g of sodium carbonate / 0↑1500 °F + 1 h at 1500 °F[641]<br>(suite à «chamois foncé») |
| | | mineral : bauxite[92]<br>powder : pinkish beige, mat |

864

| | | |
|---|---|---|
| | | origin : Alcan Company, French Guyana<br><br>production process:<br>(followed from «pinkish chamois») |
| chamois<br>↓ | 4751 | 0↑1800 °F (pinkish chamois lighter than at 1700 °F): 3 g + 25 ml nitric acid / soaking: 3 d. / drying on hot plate |
| chamois a bit darker<br>↓ | 4752 | 0↑1900 °F (pinkish chamois lighter than at 1800 °F): 3 g + 25 ml nitric acid / soaking: 3 d. / drying on hot plate |
| chamois still a bit darker | 4753 | 0↑1925 °F (flesh): 3 g + 25 ml nitric acid / soaking: 3 d. / drying on hot plate |
| chamois | 4754 | mineral : sandstone<br>rock : medium pinkish brown (light violet tone)<br>powder : medium pinkish brown (light violet tone)<br>origin : at the rear of Percé, Gaspésie, Québec<br><br>production process:<br>4 g of sandstone + 80 ml sulphuric acid / soaking: 2 wk. / drying on hot plate (old rose) / irradiated with electrons at 162,431 rad |
| chamois | 4755 | mineral : ochre[98]<br>powder : yellow<br>origin : small copper and nickel deposit, in the South-Western area of a mass of serpentinite at 3 km at the West of Saint-Fabien-de-Panet, Québec<br>production process:<br>3 g of ochre + 20 ml hydrofluoric acid / soaking: 24 h / drying in oven at 100 °F (medium brownish grey) / irradiated with electrons at 162,431 rad (followed at «medium beige [orange-pink tone]») |
| chamois | 4756 | mineral : peridotite<br>rock : medium grey<br>powder : medium brownish grey (green reflection)<br>origin : Thetford Mines, Québec<br>production process:<br>(followed from «medium beige [salmon tone or orange-pink tone]»)<br>2 g of peridotite + 2 g of sodium carbonate / 0↑1400 °F + 1 h at 1400 °F<br>(followed at «beige») |

865

| | | |
|---|---|---|
| chamois | 4757 | mineral : smaltite[25], a variety of skutterudite<br>rock : dark iron-grey, with silver metallic brilliance<br>powder : dark grey<br>origin : Cobalt, Ontario<br><br>production process:<br>3 g of smaltite + 80 ml sulphuric acid / soaking: 2 wk. / separation of the liquid and the solid / drying on hot plate (colour of the liquid: pink more acute than «light pink») / irradiated with electrons at 162,431 rad |
| chamois<br>↓<br>chamois more intense | 4758<br><br>4759 | mineral : steatite<br>rock : cold light grey, slightly translucid<br>powder : light grey<br>origin : East Broughton, Québec<br><br>production process:<br>(followed from «light brown»)<br>0↑1640 °F<br><br>0↑1660 °F<br>(followed at «orange-beige») |
| chamois | 4760 | mineral : steatite<br>rock : light evergreen<br>powder : white<br>origin : East Broughton, Québec<br><br>production process:<br>0↑1600 °F (light brownish orange): 2 g + 5 ml hydrochloric acid + 20 ml nitric acid / soaking: 3 d. / drying on hot plate<br>(followed at «pale brown») |
| chamois | 4761 | mineral : vesuvianite<br>rock : lilac<br>powder : lilac<br>origin : John Mansville Mine, Asbestos, Québec<br><br>production process:<br>(followed from «light beige»)<br>1600 °F / 15 h<br>(followed at «beige darker than "beige"») |
| chamois slightly darker than «light chamois» | 4762 | production process:<br>1600 °F / 15 h (chamois) / irradiated with electrons at 164,800 rad<br>(followed at «very light beige») |

| | | |
|---|---|---|
| chamois much darker than «light chamois» | 4763 | production process:<br>1600 °F / 15 h (chamois) / irradiated with gamma rays at 64.7 Mrad<br>(followed at «beige darker than "light beige"») |
| chamois a bit darker than «chamois» | 4764 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «chamois»)<br>2 g of asbestos + 2 g of sodium carbonate[641] /<br>0↑1600 °F + 1 h at 1600 °F<br>(followed at «orange-chamois») |
| medium chamois | 4764.1 | production process:<br>0↑1900 °F (chamois [orange tone a bit more accentuated than «light orange tone»]): 50 g + 200 ml hydrochloric acid ou asbestos entirely covered with hydrochloric acid / soaking: 1 wk. / drying on hot plate (vivid sunny yellow [light green tone]): 1 g + 6.50 g of glass powder (spruce pine batch) / manual grinding / deposited on a ceramic plate at the state of a biscuit / heated in a furnace 0↑1000 °C in ambient air / slow cooling in furnace[1275] |
| | | production process:<br>0↑1900 °F (chamois [orange tone a bit more accentuated than «light orange tone»]): 50 g + 200 ml hydrochloric acid ou asbestos entirely covered with hydrochloric acid / soaking: 1 wk. / drying on hot plate (vivid sunny yellow [light green tone]): 1 g + 6.50 g of glass powder (spruce pine batch) / manual grinding / deposited on a ceramic plate at the state of a biscuit / heated in a furnace 0↑1000 °C in ambient air / slow cooling in furnace[1275]<br>(medium chamois) / irradiated with gamma rays at: |
| chamois a bit darker than «medium chamois»<br>↓ | 4764.2 | 7.41 Mrad |
| chamois still a bit darker than «medium chamois» | 4764.3 | 9.88 Mrad |
| | | mineral : antigorite |

| | | |
|---|---|---|
| medium chamois | 4765 | rock : pale yellowish green<br>powder : very pale greenish yellow<br>origin : Canadian Refractories Mine, Kilmar, Québec<br><br>mineral : calcite[11]<br>powder : white<br>origin : Calcite du Nord Company, Saint-Eugène de Mistassini, Lac Saint-Jean, Québec<br><br>production process:<br>1 g of antigorite + 1 g of calcite / 1000 °C / 1 h |
| dark chamois | 4766 | mineral : fluorescent calcite<br>rock : white (localized grey or brown reflection), translucid<br>powder : white (yellow reflection)<br>origin : Bancroft, Ontario<br><br>production process:<br>1300 °F / 1 h |
| chamois more pale and mat than «dark chamois» | 4767 | production process:<br>1300 °F / 1 h (dark chamois) / irradiated with gamma rays at 424.7 Mrad[81] |
| dark chamois | 4768 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «yellow more accentuated than "yellow"»)<br>0↑1400 °F (pinkish beige more accentuated and pinkish than «pinkish beige»): 5 g + 25 ml hydrochloric acid / soaking: 3 d. / drying on hot plate (followed at «orange-brown») |
| chamois (yellow tone) | | |
| | | mineral : stilbite<br>rock : white (honey-yellow reflection)<br>powder : white (honey-yellow reflection)<br>origin : Lac d'amiante Mine, Black Lake, Québec<br><br>production process:<br>(followed from «light beige») |

868

| | | |
|---|---|---|
| light chamois (yellow tone) | 4769 | 1500 °F / 1 h (chalk-white [orange reflection]): .50 g + 40 ml hydrochloric acid / natural drying (white [very light yellow reflection]) / irradiated with gamma rays at 425.65 Mrad |
| chamois (yellow tone) more accentuated than «light chamois (yellow tone)» | 4770 | mineral : anorthosite<br>rock : light grey<br>powder : very, very light greyish beige<br>origin : rang Sainte-Germaine, Oka, Québec<br><br>production process:<br>1000 °C / 1 h (light chamois) / irradiated with gamma rays at 63.984 Mrad |
| chamois (orange tone) | | |
| chamois (light orange tone) still lighter than «very light chamois (orange tone)» | 4771 | mineral : amazonite<br>rock : light greenish turquoise<br>powder : white (turquoise reflection)<br>origin : Lac Sairs, Témiscamingue, Québec<br><br>mineral : sulphur<br>rock : brilliant yellow<br>powder : brilliant yellow<br>origin : unknown<br><br>production process:<br>2 g of amazonite + 2 g of sulphur / 1300 °F / 1 h (very light chamois [pinkish orange tone]) / irradiated with gamma rays at 424.7 Mrad[81] |
| very light chamois (light orange tone) | 4772 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «light khaki-green»)<br>2 g of asbestos + 2 g of sodium carbonate[641] / 0↑1900 °F + 1 h at 1900 °F |
| chamois (light orange tone) a bit darker than «very light | 4773 | production process:<br>2 g of asbestos + 2 g of sodium carbonate / 0↑1900 °F + 1 h at 1900 °F (very light chamois [light orange tone]) / irradiated with gamma rays at 190.22 Mrad |

869

| | | |
|---|---|---|
| chamois (orange tone)» | | (followed at «mixture of particles: orange-beige / greyish beige / grey / white») |
| chamois (light orange tone) a bit darker than «very light chamois (orange tone)» | 4774 | production process:<br>2 g of asbestos + 2 g of sodium carbonate / 0↑1900 °F + 1 h at 1900 °F (very light chamois [light orange tone]) / irradiated with electrons at 162,431 rad |
| light chamois (orange tone, slightly lightened) | 4775 | production process:<br>2 g of asbestos + 2 g of sodium carbonate / 0↑1400 °F + 1 h at 1400 °F (light orange-chamois) / irradiated with electrons at 302,831 rad[36] |
| light chamois (orange tone) | 4776 | production process:<br>50 g of asbestos + 200 ml hydrochloric acid or asbestos entirely covered with hydrochloric acid / soaking: 1 wk. / drying on hot plate (vivid yellow): 1 g + 4 g of sodium carbonate:<br>0↑1200 °F |
| ↓ chamois (orange tone) a bit more orange and accentuated than «light chamois (orange tone)» | 4777 | 0↑1300 °F<br>(followed at «mixture of particles: orange-chamois / greenish turquoise») |
| light chamois (orange tone) | 4778 | production process:<br>2 g of asbestos + 2 g of sodium carbonate[641] / 0↑1400 °F + 1 h at 1400 °F (followed at «chamois») |
| light chamois (orange tone strongly accentuated) | 4779 | production process:<br>0↑1900 °F (chamois [orange tone a bit more accentuated than «light orange tone»]) / irradiated with gamma[239] rays at 254.20 Mrad (followed at «medium orange-chamois») |
| light chamois (orange tone) | 4780 | production process:<br>50 g of asbestos + 200 ml hydrochloric acid or asbestos entirely covered with hydrochloric acid / soaking: 1 wk. / drying on hot plate (vivid yellow): 3 g + 1 g of sodium carbonate / 0↑1500 °F (followed at «medium orange-chamois») |
| | | mineral : antigorite |

| | | |
|---|---|---|
| light chamois (orange tone) | 4781 | rock : pale yellowish green<br>powder : very pale greenish yellow<br>origin : Canadian Refractories Mine, Kilmar, Québec<br><br>production process:<br>1000 °C / 1 h |
| light chamois (orange tone) | 4782 | production process:<br>0↑1000 °C |
| light chamois (light orange tone) | 4783 | mineral : serpentine<br>rock : yellowish green<br>powder : light greenish yellow<br>origin : probably Thetford Mines, Eastern Townships, Québec<br><br>production process:<br>2 g of serpentine + 2 g of sodium carbonate / 0↑1400 °F + 1 h at 1400 °F (pale orange) / irradiated with gamma rays at 64.7 Mrad<br>(followed at «medium orange-beige») |
| chamois (strong orange tone) | 4784 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>(followed from «chamois»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone])[63a]: 2 g + 2 g of sulphur / 1300 °F / 1 h<br>(followed at «light beige», at «chamois» and at «pinkish chamois») |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| chamois (orange tone) | 4785 | production process:<br>(followed from «chamois a bit darker than "chamois"»)<br>2 g of asbestos + 2 g of sodium carbonate[640] /<br>0↑1700 °F + 1 h at 1700 °F<br>(followed at «light khaki-green») |
| chamois (light orange tone) | 4786 | production process:<br>2000 °F / 45 min. |
| chamois (light orange tone)<br>\| | 4787 | production process:<br>(followed from «chamois»)<br>0↑1500 °F |
| chamois (orange tone a bit more accentuated)<br>\| | 4788 | 0↑1600 °F |
| chamois (orange tone still a bit more accentuated)<br>\| | 4789 | 0↑1900 °F |
| chamois (orange tone) darker than «chamois (orange tone)»<br>\| | 4790 | 0↑2000 °F |
| chamois (orange tone) still a bit darker<br>\| | 4791 | 0↑2100 °F |
| chamois (orange tone) still a bit darker<br>↓ | 4792 | 0↑2200 °F |
| chamois (orange tone) still a bit darker | 4793 | 0↑2300 °F |
| chamois (orange tone) \|<br>↓ | 4794 | mineral : bauxite[92]<br>powder : pinkish beige, mat<br>origin : Alcan Company, French Guyana<br><br>production process:<br>(followed from «salmon»)<br>0↑1100 °F (pinkish chamois): 3 g + 25 ml nitric acid / soaking: 3 d. / drying on hot plate |

| | | |
|---|---|---|
| chamois (light orange tone) | 4795 | 0↑1200 °F (pinkish chamois lighter than at 1100 °F): 3 g + 25 ml nitric acid / soaking: 3 d. / drying on hot plate<br>(followed at «chamois [beige tone]») |
| chamois (orange tone) | 4796 | mineral : fluorescent calcite<br>rock : white (localized grey or brown reflection), translucid<br>powder : white (yellow reflection)<br>origin : Bancroft, Ontario<br><br>mineral : sulphur<br>rock : brilliant yellow<br>powder : brilliant yellow<br>origin : unknown<br><br><u>production process:</u><br>2 g of calcite + 2 g of sulphur / 1300 °F / 1 h |
| chamois (orange tone) | 4797 | mineral : serpentine<br>rock : yellowish green<br>powder : light greenish yellow<br>origin : probably Thetford Mines, Eastern Townships, Québec<br><br><u>production process:</u><br>2000 °F / 45 min. |
| medium chamois (orange tone strongly accentuated) | 4798 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «light orange-chamois»)<br>0↑1900 °F (light chamois [orange tone a bit more accentuated than «light orange tone»]) / powder irradiated with gamma[239] rays at 614.20 Mrad |
| medium chamois (orange tone) | 4799 | <u>production process:</u><br>(followed from «light orange-chamois»)<br>50 g of asbestos + 200 ml hydrochloric acid <u>or</u> asbestos entirely covered with hydrochloric acid / soaking: 1 wk. / drying on hot plate (vivid yellow): 3 g + 1 g of sodium carbonate / 0↑1600 °F<br>(followed at «light brownish orange») |
| | | mineral : bauxite[92]<br>powder : pinkish beige, mat<br>origin : Alcan Company, French Guyana |

| | | |
|---|---|---|
| chamois (orange tone) lighter than «dark chamois (orange tone)» ↓ | 4800 | <u>production process:</u> (followed from «dark chamois [light brown tone]») 3 g of bauxite + 25 ml hydrochloric acid / soaking: 5 d. / drying on hot plate (olive-green [yellow tone]) / 900 °F / 2 h |
| chamois (orange tone) still lighter (tone slightly more orange) | 4801 | 3 g of bauxite + 25 ml hydrochloric acid / soaking: 5 d. / drying on hot plate (olive-green [yellow tone]) / 900 °F / 3 h |
| dark chamois (orange tone) variable to a chamois which is more beige | 4802 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process:</u><br>(followed from «pinkish chamois»)<br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone])[638]: 2 g + 2 g of sulphur / 1500 °F / 1 h<br>(followed at «chamois [beige tone]») |
| mixture of particles | | |
| light chamois (accentuated orange tone) / very light greenish turquoise | 4803 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «light orange-chamois»)<br>50 g of asbestos + 200 ml hydrochloric acid <u>or</u> asbestos entirely covered with hydrochloric acid / soaking: 1 wk. / drying on hot plate (vivid yellow): 1 g + 4 g of sodium carbonate / 0↑1400 °F<br>(followed at «very pale greenish turquoise») |
| chamois (pinkish orange tone) | | |

| | | |
|---|---|---|
| very light chamois (pinkish orange tone) | 4804 | mineral : amazonite<br>rock : light greenish turquoise<br>powder : white (turquoise reflection)<br>origin : Lac Sairs, Témiscamingue, Québec<br><br>mineral : sulphur<br>rock : brilliant yellow<br>powder : brilliant yellow<br>origin : unknown<br><br>production process:<br>2 g of amazonite + 2 g of sulphur / 1300 °F / 1 h |
| chamois (pink tone) | | |
| light chamois (pink reflection) | 4805 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br><br>production process:<br>(followed from «chamois»)<br>50 g of asbestos + 200 ml hydrochloric acid <u>or</u> asbestos entirely covered with hydrochloric acid / soaking: 1 wk. / drying on hot plate (vivid yellow): .50 g + .50 g of titanium dioxide / 1800 °F / 1 h<br>(followed at «light beige [violet-pink tone]») |
| light chamois (pink tone) | 4806 | mineral : bauxite[92]<br>powder : pinkish beige, mat<br>origin : Alcan Company, French Guyana<br><br>mineral : zirconium oxide<br>powder : light beige<br>origin : Tam Ceramic Inc., Québec<br><br>production process:<br>1 g of bauxite + 1 g of zirconium oxide / 1700 °F / 1 h |
| | | mineral : bauxite[92]<br>powder : pinkish beige, mat<br>origin : Alcan Company, French Guyana<br><br>mineral : pyrochlore |

| | | |
|---|---|---|
| light chamois (pink tone) | 4807 | powder : reddish brown<br>origin : De-Mix quarry, North side of Mont Saint-Hilaire, Rouville county, Québec<br><br>production process:<br>.50 g of bauxite + .50 g of pyrochlore / 0↑1900 °F |
| light chamois (pink tone) | 4808 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>0↑1300 °F (pinkish beige a bit more accentuated than «pinkish beige») / irradiated with electrons at 302,831 rad[36,642] |
| light chamois (pink tone) | 4809 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «pinkish beige lighter than "intense pinkish beige"»)<br>1 g of yofortierite + 50 ml sulphuric acid / soaking: 2 wk. / separation of the liquid and the solid / drying on hot plate (colour of the solid: intense blue) / irradiated with gamma rays at 424.7 Mrad |
| | | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>(followed from «chamois [strong orange tone]» or «light beige») |

876

| | | |
|---|---|---|
| chamois (pink tone) | 4810 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone])[638,640]: 2 g + 2 g of sulphur / 1400 °F / 1 h (followed at «dark orange-chamois variable to a more beige-chamois») |
| | | mineral : bauxite[92]<br>powder : pinkish beige, mat<br>origin : Alcan Company, French Guyana<br><br>production process:<br>(followed from «chamois [beige tone]») |
| chamois (pink tone) ↓ | 4811 | 0↑1500 °F (pinkish chamois lighter than at 1400 °F): 3 g + 25 ml nitric acid / soaking: 3 d. / drying on hot plate |
| pinkish chamois a bit darker ↓ | 4812 | 0↑1600 °F (pinkish chamois lighter than at 1500 °F): 3 g + 25 ml nitric acid / soaking: 3 d. / drying on hot plate |
| pinkish chamois still darker | 4813 | 0↑1700 °F (pinkish chamois lighter than at 1600 °F): 3 g + 25 ml nitric acid / soaking: 3 d. / drying on hot plate<br>(followed at «chamois») |
| | | production process: |
| pinkish chamois | 4814 | 0↑1100 °F |
| \| | 4815 | 0↑1200 °F |
| \| | 4816 | 0↑1300 °F |
| which becomes | 4817 | 0↑1400 °F |
| lighter and tends | 4818 | 0↑1500 °F |
| progressively to- | 4819 | 0↑1600 °F |
| wards tones of | 4820 | 0↑1700 °F |
| \| | 4821 | 0↑1800 °F |
| ↓ | 4822 | 0↑1900 °F |
| flesh | 4823 | 0↑1925 °F |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process: |
| pinkish chamois more pale than «medium pinkish | 4824 | 0↑1300 °F (pinkish beige a bit more accentuated than «pinkish beige») / powder irradiated with gamma rays at 64.7 Mrad[643] |

| | | |
|---|---|---|
| chamois» | | (followed at «medium milky chocolate-brown [light orange reflection]») |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «sunny yellow [orange tone]»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): |
| pinkish chamois | 4825 | 400 °F / 1 h |
| ↓ | 4826 | 500 °F / 1 h |
| which becomes | 4827 | 600 °F / 1 h |
| ↓ | 4828 | 700 °F / 1 h |
| lighter | 4829 | 800 °F / 1 h<br>(followed at «light chamois [orange-pink tone]») |
| chamois (orange-pink tone) | | |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «pinkish chamois») |
| light chamois (orange-pink tone) | 4830 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plage (vivid sunny yellow [light green tone]) / 900 °F / 1 h<br>(followed at «light orange») |
| | | mineral : granite gneiss<br>rock : reddish beige<br>powder : medium pink (light brown tone)<br>origin : Lac Beauport, region of the city of Québec, Québec<br><br>mineral : sulphur<br>rock : brilliant yellow<br>powder : brilliant yellow<br>origin : unknown |

| | | |
|---|---|---|
| light chamois (orange-pink tone) | 4831 | production process:<br>2 g of gneiss + 2 g of sulphur / 1300 °F / 1 h |
| | | mineral : serpentine<br>rock : yellowish green<br>powder : light greenish yellow<br>origin : probably Thetford Mines, Eastern Townships, Québec<br><br>production process:<br>(followed from «light chamois») |
| light chamois (light orange-pink tone) | 4832 | 0↑1400 °F |
| ¦ | 4833 | 0↑1500 °F |
| becomes more | 4834 | 0↑1600 °F |
| ¦ brown | 4835 | 0↑1700 °F |
| ↓ and the | 4836 | 0↑1800 °F |
| tone slightly | 4837 | 0↑1900 °F |
| more accentuated | 4838 | 0↑2000 °F<br>(followed at «medium orange-beige») |
| | | mineral : granite gneiss<br>rock : reddish beige<br>powder : medium pink (light brown tone)<br>origin : Lac Beauport, region of the city of Québec, Québec<br><br>mineral : sulphur<br>rock : brilliant yellow<br>powder : brilliant yellow<br>origin : unknown<br><br>production process: |
| chamois (orange-pink tone) darker than «light chamois (orange-pink tone)» | 4839 | 2 g of gneiss + 2 g of sulphur / 1300 °F / 1 h (light chamois [orange-pink tone]) / irradiated with gamma rays at 64.7 Mrad (followed at «brownish beige [orange-pink or pinkish orange reflection]») |
| | | mineral : asbestos[4]<br>rock : dark grey (green reflection)<br>powder : light grey (green reflection)<br>origin : Asbestos Corporation Ltd., Thetford Mines, Québec<br><br>production process: |
| intense chamois (orange-pink tone) | 4840 | 0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]) / |

| | | |
|---|---|---|
| | | 600 °F / 1 h (intense pinkish chamois) / irradiated with gamma rays at 190.22 Mrad (followed at «very vivid egg yolk-yellow [very accentuated orange tone]») |
| intense chamois (orange-pink tone) | 4841 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process:</u><br>(followed from «dark orange-chamois»)<br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone])[638,640]: 2 g + 2 g of sulphur / 1600 °F / 1 h (followed at «brownish chamois») |
| chamois (beige tone) | | |
| | | mineral : bauxite[92]<br>powder : pinkish beige, mat<br>origin : Alcan Company, French Guyana<br><br><u>production process:</u><br>(followed from «orange-chamois») |
| chamois (beige tone) ↓ | 4842 | 0↑1300 °F (pinkish chamois): 3 g + 25 ml nitric acid / soaking: 3 d. / drying on hot plate |
| lighter chamois (beige tone) | 4843 | 0↑1400 °F (pinkish chamois lighter than at 1300 °F): 3 g + 25 ml nitric acid / soaking: 3 d. / drying on hot plate<br>(followed at «pinkish chamois») |
| chamois (brown tone) | | |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| chamois (brown tone) | 4844 | mineral : sulphur<br>rock : brilliant yellow<br>powder : brilliant yellow<br>origin : unknown<br><br>production process:<br>(followed from «chamois [beige tone]»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone])[638,640]: 2 g + 2 g of sulphur / 1700 °F / 1 h |
| dark chamois (light brown tone) | 4845 | mineral : bauxite[92]<br>powder : pinkish beige, mat<br>origin : Alcan Company, French Guyana<br><br>production process:<br>3 g of bauxite + 25 ml hydrochloric acid / soaking: 5 d. / drying on hot plate (olive-green [yellow tone]) / 900 °F / 1 h<br>(followed at «orange-chamois») |
| chamois (grey tone) | | |
| chamois (light grey tone) | 4846 | mineral : asbestos[4]<br>rock : dark grey (green reflection)<br>powder : light grey (green reflection)<br>origin : Asbestos Corporation Ltd., Thetford Mines, Québec<br>production process:<br>(followed from «grey [light beige tone]»)<br>0↑1100 °F<br>(followed at «chamois») |
| chamois (grey tone) | 4846.1 | mineral : asbestos[4]<br>rock : dark grey (green reflection)<br>powder : light grey (green reflection)<br>origin : Asbestos Corporation Ltd., Thetford Mines, Québec<br><br>mineral : fuel oil soot[86]<br>powder : profound brownish black<br>origin : boiler room of Laval University, city of Québec, Québec<br><br>production process:<br>asbestos is heated 0↑1900 °F (chamois [light orange tone]): 1 g + .25 g of soot / grinding |

| | | |
|---|---|---|
| chamois (grey tone more accentuated) ↓ | 4846.2 | asbestos is heated 0↑1900 °F (chamois [light orange tone]): 1 g + .50 g of soot / grinding |
| chamois (grey tone more pronounced) | 4846.3 | asbestos is heated 0↑1900 °F (chamois [light orange tone]): 1 g + .75 g of soot / grinding |
| ivory-beige | | |
| ivory-beige | 4847 | mineral : steatite<br>rock : cold light grey, slightly translucid<br>powder : light grey<br>origin : East Broughton, Québec<br><br>production process:<br>30 g of steatite + 50 ml nitric acid / soaking: 1 wk. / drying on hot plate (beige [very light orange tone]): .3 g + 50 cc of transparent polyester resin + 1% of catalyst / manual grinding / moulding / hardening (very, very light grey) / irradiated with electrons at 155,082 rad<br>(followed at «very light greenish yellow») |
| creamy beige | | |
| very light beige (creamy beige type) | 4848 | mineral : steatite<br>rock : cold light grey, slightly translucid<br>powder : light grey<br>origin : East Broughton, Québec<br><br>production process:<br>2 g of steatite + 25 ml nitric acid / soaking: 3 d. / drying on hot plate<br>(followed at «very, very light brown» and «light grey») |
| light creamy beige | 4849 | mineral : agate<br>rock : dark grass-green, slightly translucid<br>powder : light grey (light green tone)<br>origin : bank of St.-Lawrence river, region of Maria, Gaspésie, Québec<br><br>production process:<br>(followed from «very light greyish green»)<br>1 g of agate + 1 cc of white opaque synthetic enamel paint used for the car / manual grinding / application on a piece of steel sheet used for the car's body measuring 1" x 1" (very, very light greyish green [almost white]) / irradiated with gamma rays |

882

| | | |
|---|---|---|
| | | at 102.4 Mrad<br>(followed at «orange-beige») |
| light creamy beige | 4850 | mineral : amethyst<br>rock : violet, translucid<br>powder : light grey (lilac tone)<br>origin : Thunderbay, Ontario<br><br><u>production process:</u><br>(followed from «greyish beige»)<br>2 g of amethyst + 2 g of sodium carbonate /<br>0↑1500 °F + 15 min. at 1500 °F<br>(followed at «dark creamy beige») |
| light creamy beige | 4851 | <u>production process:</u><br>2 g of amethyst + 2 g of sodium carbonate /<br>0↑1500 °F + 15 min. at 1500 °F (light creamy beige)<br>/ irradiated with electrons at 162,431 rad |
| light creamy beige | 4852 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «pale green»)<br>50 g of asbestos + 200 ml hydrochloric acid <u>or</u> asbestos entirely covered with hydrochloric acid /<br>soaking: 1 wk. / drying on hot plate (vivid yellow): .50 g + .50 g of sodium carbonate (light and vivid orange [beige tone]) / 0↑1900 °F (green) /<br>irradiated with gamma rays at 425.65 Mrad |
| light creamy beige | 4854 | mineral : steatite<br>rock : cold light grey, slightly translucid<br>powder : light grey<br>origin : East Broughton, Québec<br><br><u>production process:</u><br>(followed from «medium beige [light orange tone]»)<br>0↑1200 °F (grey more accentuated than «light grey»):<br>2 g + 20 ml hydrochloric acid + 5 ml nitric acid /<br>soaking: 3 d. / drying on hot plate |
| creamy beige a bit more beige, darker | 4855 | 0↑1200 °F (grey more accentuated than «light grey):<br>2 g + 15 ml hydrochloric acid + 10 ml nitric acid /<br>soaking: 3 d. / drying on hot plate |

| | | |
|---|---|---|
| ↓ creamy beige a bit more beige and darker (light yellow tone) | 4856 | 0↑1200 °F (grey more accentuated than «light grey»): 2 g + 10 ml hydrochloric acid + 15 ml nitric acid / soaking: 3 d. / drying on hot plate (followed at «beige [light brown tone]» and at «very, very light brown») |
| creamy beige much more intense and lightly darker than «light creamy beige» | 4857 | mineral : sphalerite[27]<br>rock : dark grey, with golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) the liquid at the surface; b) the layer between: a mixture of liquid and solid; c) the residual solid at the bottom of the solution / natural drying (colour of the layer in the middle: creamy beige [near the brownish beige]) / the layer in the middle is irradiated with gamma rays at 64.7 Mrad (followed at «light brown [light orange tone]») |
| creamy beige | 4858 | mineral : beryl<br>rock : very light yellowish green, slightly translucid<br>powder : white (green reflection)<br>origin : Lacorne district, Abitibi, Québec<br><br>production process:<br>(followed from «medium brownish beige [grey and pink tones]»)<br>2 g of beryl + 2 g of sodium carbonate / 0↑1400 °F + 1 h at 1400 °F<br>(followed at «brown») |
| creamy beige | 4859 | mineral : calcite (with clayey inclusions)<br>rock : very light creamy yellow, translucid<br>powder : white<br>origin : De-Mix quarry, near Saint-Philippe de Laprairie, Québec<br>production process:<br>(followed from «light beige»)<br>1 g of calcite + 1 cc of white transparent synthetic enamel paint used for the car[94] / manual grinding / application on a piece of steel sheet used for the car's body measuring 1" x 1" (light yellowish cream) / irradiated with gamma rays at 57.4 Mrad[351,352] |

| | | |
|---|---|---|
| | | (followed at «orange-beige») |
| | | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>0↑900 °F (fairly dark yellowish beige) / powder irradiated with gamma rays at: |
| creamy beige | 4860 | 64.7 Mrad |
| ↓ | | |
| creamy beige | 4861 | 424.7 Mrad |
| | | mineral : sphalerite[27]<br>rock : dark grey, with golden yellow metallic brilliance<br>powder : dark brownish grey<br>origin : Matagami Mine, Matagami, Québec<br><br>production process: |
| creamy beige [nears brownish beige] | 4862 | 4 g of sphalerite + 25 ml nitric acid / soaking: 3 d. / separation of the liquid (1st) and the solid / addition of 25 ml nitric acid to the same solid / soaking: 3 d. / separation in 3 parts: a) liquid (2nd) at the surface; b) layer in the middle: a mixture of the liquid and the solid; c) residual solid at the bottom of the solution / natural drying / colour of b) the layer in the middle[644] [a mixture of the solid and the liquid] |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>2 g of wilsonite + 2 g of sodium carbonate: |
| creamy beige | 4863 | 0↑1200 °F + 1 h at 1200 °F |
| ↓ | | |
| more acute creamy beige | 4864 | 0↑1300 °F + 1 h at 1300 °F<br>(followed at «creamy beige [green tone]») |
| | | mineral : amethyst<br>rock : violet, translucid<br>powder : light grey (lilac tone)<br>origin : Thunderbay, Ontario |

585

| | | |
|---|---|---|
| dark creamy beige | 4865 | production process:<br>(followed from «light creamy beige»)<br>2 g of amethyst + 2 g of sodium carbonate /<br>0↑1500 °F + 1 h at 1500 °F<br>(followed at «azure-blue») |
| creamy beige (green tone) | | |
| creamy beige (green tone) | 4866 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «creamy beige darker than "creamy beige"»)<br>2 g of wilsonite + 2 g of sodium carbonate /<br>0↑1400 °F + 1 h at 1400 °F<br>(followed at «light green [light beige tone]») |
| creamy beige (accentuated apple-green tone)<br>↓ | 4866.1 | mineral : bauxite[92]<br>powder : pinkish beige, mat<br>origin : Alcan Company, French Guyana<br><br>production process:<br>(followed from «light greyish beige [green reflection]»)<br>20 g of bauxite + 20 g of caustic soda /<br>0↑1010 °C |
| creamy beige (apple-green tone a bit more accentuated) | 4866.2 | 20 g of bauxite + 20 g of caustic soda /<br>0↑1037 °C<br>(followed at «pale apple-green [creamy beige tone]») |
| creamy beige (orange-pink tone) | | |
| dark creamy beige (light orange-pink tone) | 4867 | mineral : clay<br>block : pale greyish green<br>powder : pale greyish green<br>origin : bank of St.-Lawrence river, at the rear of the Miguasha Museum, Gaspésie, Québec<br><br>production process:<br>0↑1900 °F (medium brown [orange-red tone]): 1 g + 50 ml sulphuric acid / soaking: 2 wk. / drying on hot plate |
| creamy beige (light orange-pink tone) | 4868 | production process:<br>0↑1900 °F (medium brown [orange-red tone]): 1 g + 50 ml sulphuric acid / soaking: 2 wk. / drying on |

886

| | | |
|---|---|---|
| a bit darker and brown than «dark creamy beige (orange-pink tone)» | | hot plate (dark creamy beige [light orange-pink tone]) / irradiated with gamma rays at 64.7 Mrad (followed at «medium orange-brown») |
| mixture of particles | | |
| mostly creamy beige / slightly rusty brown | 4869 | mineral : pyrophillite<br>rock : light beige (grey and pink tones), opaque<br>powder : very light beige (grey and orange pink tones)<br>origin : Carpentier district, Abitibi, Québec<br><br>production process:<br>0↑1900 °F (light beige): .20 g + 50 ml nitric acid / soaking: 2 wk. / drying on hot plate (mixture of particles: creamy beige / rusty brown) / irradiated with electrons at 162,431 rad |
| beige (yellow tone) | | |
| yellowish beige reflection | 4870 | mineral : polylithionite<br>rock : transparent (beige reflection)<br>powder : transparent (beige reflection)<br>origin : De-Mix quarry, North side of Mont Saint-Hilaire, Rouville county, Québec<br><br>production process:<br>rock entirely covered with 20 ml hydrochloric acid / soaking: 2 wk. / irradiated with gamma rays at 5.7 Mrad / drying on sand bath, completed on hot plate[645] |
| beige (yellow pronounced tone) more accentuated than «pale yellowish beige» | 4871 | mineral : fluorine<br>rock : light pink, translucid<br>powder : white (light pink reflection)<br>origin : Saint-Lawrence Fluorspar Company, Saint-Lawrence, Newfoundland<br><br>production process:<br>(followed from «accentuated ivory»)<br>2 g of fluorine + 20 ml hydrochloric acid / soaking: 3 d. / drying on hot plate (orange): .2 g + 50 cc of transparent polyester resin + 1% of catalyst / manual grinding / moulding / hardening (pale beige-grey [light yellow reflection]) / irradiated with electrons at 305,082 rad |
| | 4872 | mineral : limestone[645a] |

887

| | | |
|---|---|---|
| very, very light yellowish beige<br>↓<br>yellowish beige much more accentuated | 4873<br><br>4874 | rock : white (yellow reflection), opaque<br>origin : region of Montréal, Québec<br><br>production process:<br>rock irradiated with gamma rays at:<br>63.984 Mrad<br><br>122.984 Mrad<br>(followed at «light beige») |
| very, very light yellowish beige | 4874.1 | mineral : selenium<br>powder : dark metallic grey<br>origin : Minéraux Noranda Inc., lot 3847, Montréal, Québec<br><br>production process:<br>3 g of selenium + 5 g of pyrex / manual grinding / heating: 5 °C per min. from 0↑1245 °C + maintenance during 1 h / cooling: 5 °C per min. until ambient temperature is reached / the entity is done in ambient air |
| very, very light yellowish beige | 4875 | mineral : serpentine<br>rock : yellowish green<br>powder : light greenish yellow<br>origin : probably Thetford Mines, Eastern Townships, Québec<br><br>production process:<br>3 g of serpentine + 20 ml hydrofluoric acid / soaking: 24 h / drying in oven at 100 °F |
| very light yellowish beige | 4876 | mineral : andulusite<br>rock : light brownish grey<br>powder : light grey<br>origin : Bimbowrie, South Australia<br><br>production process:<br>0↑1900 °F (light beige): 1 g + 50 ml nitric acid / soaking: 2 wk. / separation of the liquid and the solid / drying on hot plate / colour of the solid[455] |
| very light beige | 4877 | mineral : apophyllite<br>rock : milky white, translucid<br>powder : white<br>origin : Gaspé Copper Mine, Gaspé, Québec<br><br>production process:<br>0↑1800 °F (light grey): .20 g + 50 ml sulphuric |

| | | |
|---|---|---|
| (yellow or green reflection) | | acid / soaking: 2 wk. / drying on hot plate (white [light green reflection]) / irradiated with gamma rays at 64.7 Mrad (followed at «light greyish beige») |
| very light beige (light yellow tone) | 4878 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑1200 °F + 1 h at 1200 °F (cream [light orange tone]) / irradiated with electrons at 302,831 rad[36] |
| yellowish beige darker than «very light yellowish beige» | 4879 | mineral : obsidian<br>rock : very dark smoky grey, almost black<br>powder : light grey<br>origin : Arkansas, United States<br><br>production process:<br>2 g of obsidian + 20 ml sulphuric acid / soaking: 3 d. / drying on hot plate (medium greyish brown): .3 g + 50 cc of transparent polyester resin + 1% of catalyst / manual grinding / moulding / hardening (very light lemon-yellow) / irradiated with electrons at 155,082 rad (followed at «lemon-yellow») |
| light yellowish beige | 4880 | mineral : anorthosite<br>rock : dark grey<br>powder : medium grey<br>origin : Jonquière, Lac Saint-Jean, Québec<br><br>production process:<br>(followed from «white [yellow or beige reflection]»)<br>0↑1900 °F (medium brown): .3 g + 50 ml sulphuric acid / soaking: 2 wk. / separation of the liquid and the solid / drying on hot plate (colour of the liquid: white) / irradiated with electrons at 302,831 rad[45] |
| | | mineral : barite<br>rock : pinkish white<br><br>powder : white<br>origin : Niobec Mine, Saint-Honoré, Saguenay, Québec |

| | | |
|---|---|---|
| light beige<br>(yellow reflection) | 4881 | <u>production process:</u><br>(followed from «light beige [yellow reflection]»)<br>0↑2000 °F |
| light yellowish<br>beige or light<br>yellow (beige tone) | 4882 | <u>production process:</u><br>4 g of barite + 50 ml nitric acid / soaking: 2 wk. / drying on hot plate (white [light yellow reflection]) / irradiated with electrons at:<br>162,431 rad |
| ↓<br>light yellowish<br>beige or light<br>yellow (beige tone) | 4883 | 302,831 rad[36,45] |
| light beige<br>(yellow reflection) | 4884 | mineral : calcite<br>rock : light pink<br>powder : pinkish white<br>origin : Huddersfield district, Pontiac county, Québec<br><br><u>production process:</u><br>4 g of calcite + 20 ml hydrochloric acid / soaking: 3 d. / drying on hot plate (vivid yellow [light orange tone]): .3 g + 50 cc of transparent polyester resin + 1% of catalyst / manual grinding / moulding / hardening (very, very light yellowish grey) / irradiated with electrons at 155,082 rad (followed at «grey [accentuated and dark yellow reflection]») |
| light yellowish<br>beige or light<br>yellow (beige tone) | 4885 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>2 g of fluorine + 20 ml hydrochloric acid / soaking: 3 d. / drying on hot plate (yellow): .2 g + 50 cc of transparent polyester resin + 1% of catalyst / manual grinding / moulding / hardening (very light greenish grey) / irradiated with electrons at 155,082 rad<br>(followed at «light yellowish green») |
| | | mineral : ochre[128]<br>powder : black<br>origin : Red Mill, in the suburbs of Cap-de-la-Madeleine, Québec |

| | | |
|---|---|---|
| light yellowish beige | 4887 | mineral : titanium dioxide<br>powder : white<br>origin : NL Chem Canada Inc., Québec<br><br>production process:<br>(followed from «light brownish beige»)<br>1 g of ochre + 2 g of titanium dioxide /<br>0↑1700 °F<br>(followed at «light orange-beige») |
| light yellowish beige | 4888 | mineral : orthoclase<br>rock : white (grey reflection)<br>powder : white (grey reflection)<br>origin : mine near Buckingham, Papineau county Québec<br><br>production process:<br>.3 g of orthoclase + 50 cc of transparent polyester resin + 1% of catalyst / manual grinding / moulding / hardening (white) / irradiated with gamma rays at 5.7 Mrad |
| light yellowish beige | 4889 | mineral : pentlandite[102]<br>rock : dark iron-grey, with silver and yellow golden metallic brilliance<br>powder : dark iron-grey (pronounced brown tone)<br>origin : Inco Company, Sudbury, Ontario<br><br>production process:<br>4 g of pentlandite + 80 ml sulphuric acid / soaking: 2 wk. / drying on hot plate (light creamy yellow) / irradiated with gamma rays at 70.4 Mrad<br>(followed at «light beige») |
| light yellowish beige<br>↓<br>light yellowish beige still more yellowish | 4890<br><br>4891 | mineral : sericite shale<br>rock : light grey (green reflection)<br>powder : very, very light grey<br>origin : Magog, Québec<br><br>production process:<br>(followed from «light beige»)<br>2 g of shale + 2 g of sodium carbonate:<br>0↑1400 °F + 1 h at 1400 °F<br>(followed at «light beige [very light orange tone]»)<br>(followed from «light beige [very light orange tone]»)<br>0↑1500 °F + 1 h at 1500 °F<br>(followed at «pale orange») |
| | | mineral : antigorite |

891

| | | |
|---|---|---|
| light beige (light yellow tone) | 4892 | rock : pale yellowish green<br>powder : very pale greenish yellow<br>origin : Canadian Refractories Mine, Kilmar, Québec<br><br>production process:<br>2 g of antigonite + 20 ml ether / natural drying |
| light beige (light yellow tone) | 4893 | production process:<br>2 g of antigonite + 20 ml ammonia / natural drying |
| light beige (light yellow tone) | 4894 | production process:<br>powder irradiated with gamma rays at 64.7 Mrad (followed at «light beige-orange») |
| light beige (very accentuated yellow reflection) | 4895 | mineral : obsidian<br>rock : very dark smoky grey, almost black<br>powder : light grey<br>origin : Arkansas, United States<br><br>production process:<br>(followed from «light beige»)<br>.3 g of obsidian + 50 cc of transparent polyester resin + 1% of catalyst / manual grinding / moulding / hardening (very light grey [light yellow reflection]) / irradiated with electrons at 305,082 rad[354] |
| light yellowish beige | 4896 | mineral : vesuvianite<br>rock : lilac<br>powder : lilac<br>origin : John Mansville Mine, Asbestos, Québec<br><br>production process:<br>12 g of vesuvianite + 40 ml hydrochloric acid / soaking: 1 wk. / drying on sand bath |
| beige (yellow tone more pronounced) | 4897 | mineral : apatite<br>rock : dark grass-green (yellow tone), very slightly translucid<br>powder : powder filtered at 14 meshes: very, very light green; beneath 14 meshes: light grey (beige tone and green reflection)<br>origin : Ile Calumet, Pontiac county, Québec<br><br>production process:<br>(followed from «beige-ivory»)<br>3 g of apatite + 20 ml sulphuric acid / soaking: 3 d. / drying on hot plate (light beige): .3 g + 50 |

| | | |
|---|---|---|
| more accentuated than «light yellowish beige» | | cc of transparent polyester resin + 1% of catalyst / manual grinding / moulding / hardening (light beige [light yellow reflection]) / irradiated with electrons at 305,082 rad[354] |
| yellowish beige or beige (yellow tone) lightly darker than «light yellowish beige» | 4898 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 25 ml sulphuric acid / soaking: 24 h / drying on hot plate (light greyish green): .2 g + 50 cc of transparent polyester resin + 1% of catalyst / manual grinding / moulding / hardening (light beige [light yellow reflection]) / irradiated with gamma rays at 11.4 Mrad |
| beige (light yellow reflection) darker than «light yellowish beige» | 4899 | production process:<br>3 g of hornblende + 25 ml sulphuric acid / soaking: 24 h / drying on hot plate (light greyish green): .2 g + 50 cc of transparent polyester resin + 1% of catalyst / manual grinding / moulding / hardening (light beige [light yellow reflection]) / irradiated with electrons at:<br>155,082 rad |
| ↓<br>beige more intense (yellow tone more acute) | 4900 | 305,082 rad[354] |
| yellowish beige darker than «light yellowish beige» | 4901 | mineral : serpentine<br>rock : yellowish green<br>powder : light greenish yellow<br>origin : probably Thetford Mines, Eastern Townships, Québec<br><br>production process:<br>(followed from «very light brown»)<br>3 g of serpentine + 25 ml nitric acid / soaking: 24 h / separation of the liquid and the solid / drying on hot plate (colour of the solid: light beige): .3 g + 50 cc of transparent polyester resin + 1% of catalyst / manual grinding / moulding / hardening (light orange-beige) / irradiated |

893

| | | |
|---|---|---|
| | | with electrons at 305,082 rad[354] |
| beige (light yellow reflection) darker than «light yellowish beige» | 4902 | production process:<br>.3 g of serpentine + 50 cc of transparent polyester resin + 1% of catalyst / manual grinding / moulding / hardening (light beige [light yellow reflection]) / irradiated with electrons at 155,082 rad<br>(followed at «yellowish beige [green tone]») |
| yellowish beige | 4903 | mineral : andulusite<br>rock : light brownish grey<br>powder : light grey<br>origin : Bimbowrie, South Australia<br><br>production process:<br>0†1900 °F (light beige): 1 g + 50 ml nitric acid / soaking: 2 wk. / separation of the liquid and the solid / drying on hot plate (colour of the solid: very light yellowish beige) / irradiated with gamma rays at 70.4 Mrad<br>(followed at «mixture of particles: light grey / light beige / mostly medium greyish brown») |
| beige (light yellow tone) | 4904 | mineral : calcite[11]<br>powder : white<br>origin : Calcite du Nord Company, Saint-Eugène de Mistassini, Lac Saint-Jean, Québec<br><br>production process:<br>4 g of calcite + 25 ml sulphuric acid / soaking: 24 h / drying on hot plate (very light beige): .3 g + 50 cc of transparent polyester resin + 1% of catalyst / manual grinding / moulding / hardening (light beige [light yellow reflection]) / irradiated with electrons at 155,082 rad<br>(followed at «dark lemon-yellow») |
| yellowish beige | 4905 | mineral : calcite (with clayey inclusions)<br>rock : very light creamy yellow, translucid<br>powder : white<br>origin : De-Mix quarry, near Saint-Philippe de Laprairie, Québec<br><br>production process:<br>1600 °F / 1 h (medium beige [pinkish orange tone]) / rock irradiated with gamma rays at 64.7 Mrad<br>(followed at «medium honey-yellow») |

| | | |
|---|---|---|
| yellowish beige | 4906 | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>light amber sheet entirely covered with 20 ml hydrochloric acid / soaking: 2 wk. / irradiated with gamma rays at 11.4 Mrad / drying on sand bath, completed on hot plate[646] |
| yellowish beige | 4907 | mineral : ochre[98]<br>powder : yellow<br>origin : small copper and nickel deposit, in the South-Western area of a mass of serpentinite at 3 km at the West of Saint-Fabien-de-Panet, Québec<br><br><u>production process:</u><br>10 g of ochre + 100 ml hydrochloric acid / soaking: 1 wk. / drying on hot plate (medium yellowish cream [light orange tone]) / irradiated with gamma rays at 64.7 Mrad<br>(followed at «dark brownish beige») |
| | | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>(followed from «brownish beige») |
| yellowish beige<br>↓ | 4908 | 0↑ 800 °F |
| yellowish beige darker and more accentuated<br>↓ | 4909 | 0↑ 900 °F |
| yellowish beige still darker and more accentuated | 4910 | 0↑1000 °F<br><br>(followed at «light chocolate-brown») |
| | | mineral : ochre[98]<br>powder : yellow<br>origin : small copper and nickel deposit, in the South-Western area of a mass of serpentinite at 3 km at the West of Saint-Fabien-de-Panet, Québec |

| | | |
|---|---|---|
| beige (light yellow tone) much more pale than «medium yellowish beige» | 4911 | production process:<br>3 g of ochre + 20 ml hydrofluoric acid / soaking: 24 h / drying in oven at 100 °F (medium brownish grey) / irradiated with gamma rays at 64.7 Mrad (followed at «dark brownish beige») |
| yellowish beige lighter than «medium yellowish beige» | 4912 | mineral : chalcopyrite<br>powder : dark grey (light green tone)<br>origin : Centre de recherche des Mines Noranda in Montréal, Québec<br><br>production process:<br>(followed from «medium orange-beige»)<br>4 g of chalcopyrite + 50 ml nitric acid / bubbles as soon as the mineral is put in the acid / separation of the liquid and the solid immediately after the bubbling / the 2 rest separately during 1 wk. (colour of the solid: light chocolate-brown) / irradiated with electrons at 302,831 rad[45] |
| medium yellowish beige | 4913 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>(followed from «chamois lighter than "light chamois"»)<br>0↑900 °F (fairly dark yellowish beige): 1 g + 40 ml sulphuric acid / soaking: 14 d. / drying on hot plate (light brownish beige) / irradiated with gamma rays at 425.65 Mrad |
| dark beige (light yellow or orange tone) | 4914 | mineral : pyrophillite<br>rock : light beige (grey and pink tones), opaque<br>powder : very light beige (grey and orange-pink tones)<br>origin : Carpentier district, Abitibi, Québec<br><br>production process:<br>0↑1900 °F (light beige): .2 g + 50 ml sulphuric acid / soaking: 2 wk. / drying on hot plate (medium beige [very light grey tone]) / irradiated with gamma rays at 424.7 Mrad[81] |

896

| | | |
|---|---|---|
| beige (golden yellow tone) | | |
| beige (golden yellow tone with grey reflection) | 4915 | mineral : steatite<br>rock : light cold grey, slightly translucid / sticks measuring 1/2" x 4 7/8" x 1/8"; weighing 15 g<br>powder : light grey<br>origin : East Broughton, Québec<br><br>production process:<br>(followed from «grey more accentuated than "medium grey"»)<br>rock heated: 0↑1600 °F<br>(followed at «beige [orange-copper tone and grey reflection]») |
| beige (honey-yellow tone) | | |
| beige (honey-yellow tone) | 4916 | mineral : fluorine<br>rock : white (pink reflection), translucid<br>powder : white (grey reflection)<br>origin : Saint-Lawrence Fluorspar Company, Saint-Lawrence, Newfoundland<br>production process:<br>rock irradiated with electrons at 155,082 rad (light smoky grey tint), then with gamma rays at 360 Mrad[647] |
| beige (straw-yellow tone) | | |
| medium beige (straw-yellow tone) | 4917 | mineral : polylithionite<br>rock : transparent (beige reflection)<br>powder : transparent (beige reflection)<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br>production process:<br>2 g of polylithionite + 2 g of sulphur / 1300 °F / 1 h (light beige) / irradiated with gamma rays at 424.7 Mrad[81,648] |
| yellowish beige (green tone) | | |
| | | mineral : serpentine<br>rock : yellowish green<br>powder : light greenish yellow<br>origin : probably Thetford Mines, Eastern Townships, Québec |

| | | |
|---|---|---|
| beige (accentuated greenish yellow reflection) a bit darker than «light beige (greenish yellow reflection)» | 4918 | production process:<br>(followed from «yellowish beige darker than "light yellowish beige"»)<br>.3 g of serpentine + 50 cc of transparent polyester resin + 1% of catalyst / manual grinding / moulding / hardening (light beige [light yellow reflection]) / irradiated with electrons at 305,082 rad[354] |
| beige (orange-yellow tone) | | |
| medium beige (orange-yellow tone)<br>↓<br>dark beige (orange-yellow tone) | 4919<br><br>4920 | mineral : vesuvianite<br>rock : lilac<br>powder : lilac<br>origin : John Mansville Mine, Asbestos, Québec<br><br>production process:<br>(followed from «dark beige [orange-pink tone]»)<br>0↑1600 °F (light beige): .50 g + 40 ml hydrochloric acid / natural drying<br><br>0↑1700 °F (beige darker than «beige»): .50 g + 40 ml hydrochloric acid / natural drying |
| very dark beige (orange-yellow tone) | 4921 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «beige much darker than "very light beige"»)<br>3 g of wilsonite + 50 ml nitric acid / soaking: 2 wk. / drying on hot plate (very light beige [orange-pink tone]) / irradiated with gamma rays at 424.7 Mrad |
| yellowish beige (green-grey tone) | | |
| | | mineral : steatite<br>rock : light evergreen<br>powder : white<br>origin : East Broughton, Québec<br><br>production process:<br>(followed from «ivory [very light yellow reflection]») |

| | | |
|---|---|---|
| medium yellowish beige (light green-grey tone) | 4922 | 2 g of steatite + 20 ml nitric acid / soaking: 3 d. / natural drying (white [light yellow reflection]) / irradiated with gamma rays at 424.7 Mrad |
| beige (orange tone) | | |
| very pale beige (orange tone) or very pale orange (beige tone) | 4923 | mineral : dolomite<br>rock : white (localized yellow reflection), crystalline and translucid<br>powder : white<br>origin : Bristol district, Pontiac county, Québec<br><br>production process:<br>.3 g of dolomite + 50 cc of transparent polyester resin + 1% of catalyst / manual grinding / moulding / hardening (very, very light greenish grey) / irradiated with gamma rays at 5.7 Mrad |
| pale beige (orange tone) | 4924 | mineral : fluorescent calcite<br>rock : white (localized grey or brown reflection), translucid<br>powder : white (yellow reflection)<br>origin : Bancroft, Ontario<br><br>production process:<br>4 g of calcite + 20 ml sulphuric acid / soaking: 3 d. / drying on hot plate (white [light beige reflection]): .3 g + 50 cc of transparent polyester resin + 1% of catalyst / manual grinding / moulding / hardening (light grey [yellow reflection]) / irradiated with gamma rays at 5.7 Mrad |
| pale beige (orange tone) | 4925 | mineral : calcite<br>rock : light pink<br>powder : pinkish white<br>origin : Huddersfield district, Pontiac county, Québec<br><br>production process:<br>4 g of calcite + 20 ml sulphuric acid / soaking: 3 d. / drying on hot plate (light beige [localized pink tone]): .3 g + 50 cc of transparent polyester resin + 1% of catalyst / manual grinding / moulding / hardening (light lemon-yellow) / irradiated with gamma rays at 5.7 Mrad |
| | | mineral : fluorine<br>rock : colourless, transparent |

899

| | | |
|---|---|---|
| pale beige (light orange tone) | 4926 | powder : colourless, transparent<br>origin : unknown<br><br>production process:<br>2 g of fluorine + 25 ml nitric acid / soaking: 24 h / drying on hot plate (light grey): .3 g + 50 cc of transparent polyester resin + 1% of catalyst / manual grinding / moulding / hardening (very light grey) / irradiated with gamma rays at 11.4 Mrad |
| pale beige (light orange tone) | 4927 | mineral : hornblende<br>rock : medium evergreen (light grey tone), with vitreous brilliance<br>powder : medium cold grey (light green tone)<br>origin : Abitibi, Québec<br><br>production process:<br>3 g of hornblende + 20 ml hydrofluoric acid / soaking: 24 h / drying in oven at 100 °F (white): .2 g + 50 cc of transparent polyester resin + 1% of catalyst / manual grinding / moulding / hardening (very light grey) / irradiated with gamma rays at 5.7 Mrad |
| pale beige (orange reflection) | 4928 | mineral : microcline<br>rock : white (grey reflection)<br>powder : white (grey reflection)<br>origin : Buckingham, Québec<br><br>production process:<br>0↑1900 °F (light grey): .50g + 50 ml hydrochloric acid / soaking: 2 wk. / drying on hot plate (light orange [colour is identical to the fruit]) / irradiated with electrons at 302,831 rad[36] |
| | | mineral : olivine<br>rock : light grey, crystalline<br>powder : very light grey<br>origin : Mont Albert, Gaspésie, Québec<br><br>production process:<br>2 g of olivine + 2 g of sodium carbonate / 0↑1600 °F + 20 min. at 1600 °F (greenish brown [tends towards olive-green]) / irradiated with electrons at: |
| pale orange-beige | 4929 | 162,431 rad |
| ↓ | | |
| pale orange-beige | 4930 | 302,831 rad[45] |
| | | mineral : orthoclase<br>rock : light pinkish beige |

| | | |
|---|---|---|
| | | powder : very light beige<br>origin : mine near Buckingham, Papineau county, Québec<br><br>production process:<br>rock irradiated with electrons at: |
| pale orange-beige | 4931 | 302,831 rad[45,239] |
| ↓ | | |
| pale orange-beige | 4932 | 305,200 rad[46] |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process: |
| orange-beige darker than «pale orange-beige» | 4933 | 2 g of iron sulphide - nickel + 2 g of sodium carbonate / 0↑1400 °F + 1 h at 1400 °F (pale mossy green) / irradiated with gamma rays at 64.7 Mrad (followed at «brownish beige [grey tone]») |
| | | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>3 g of ochre + 20 ml hydrofluoric acid / soaking: 24 h / drying in oven at 100 °F (medium brownish grey): .3 g + 50 cc of transparent polyester resin + 1% of catalyst / manual grinding / moulding / hardening (pale beige [light orange reflection]) / irradiated with electrons at: |
| beige (light orange reflection) darker than «pale orange-beige» | 4934 | 155,082 rad |
| ↓ | | |
| beige a bit darker (orange reflection more intense) | 4935 | 305,082 rad[354] |

| | | |
|---|---|---|
| very light beige (orange reflection) | 4936 | mineral : andulusite<br>rock : light brownish grey<br>powder : light grey<br>origin : Bimbowrie, South Australia<br><br>production process:<br>(followed from «light orange-beige»)<br>2 g of andulusite + 2 g of sodium carbonate / 0↑1400 °F + 1 h at 1400 °F (beige [light green tone]) / irradiated with electrons at 302,831 rad[45] |
| very light orange-beige | 4937 | mineral : antigorite<br>rock : pale yellowish green<br>powder : very pale greenish yellow<br>origin : Canadian Refractories Mine, Kilmar, Québec<br><br>production process:<br>2 g of antigorite + 2 g of sodium carbonate / 0↑1500 °F + 30 min. at 1500 °F (creamy yellow [light green tone]) / irradiated with electrons at 162,431 rad<br>(followed at «light orange-beige») |
| very light beige (light orange tone) | 4938 | mineral : apatite<br>rock : pale brownish green<br>powder : very light greyish green<br>origin : Black Lake, Thetford county, Québec<br><br>production process:<br>2 g of apatite + 20 ml hydrofluoric acid / soaking: 24 h / drying in oven at 100 °F (very light orange[24]): .3 g + 50 cc of transparent polyester resin + 1% of catalyst / manual grinding / moulding / hardening (very, very light orange or beige or grey) / irradiated with gamma rays at 11.4 Mrad |
| very light beige | 4939 | mineral : dolomite<br>rock : light grey<br>powder : light grey<br>origin : Shefferville, Ungava, Québec<br><br>mineral : sulphur<br>rock : brilliant yellow<br>powder : brilliant yellow<br>origin : unknown<br><br>production process:<br>2 g of dolomite + 2 g of sulphur / 1300 °F / 1 h |

902

| | | |
|---|---|---|
| (orange reflection) | | (medium orange-beige) / irradiated with electrons at 302,831 rad[36] |
| very light beige (very light orange tone) | 4940 | mineral : gypsum<br>rock : white (yellow reflection)<br>powder : white (yellow reflection)<br>origin : Geisborough, Nova Scotia<br><br>mineral : sulphur<br>rock : brilliant yellow<br>powder : brilliant yellow<br>origin : unknown<br><br>production process:<br>2 g of gypsum + 2 g of sulphur / 1300 °F / 1 h |
| very light orange-beige | 4941 | mineral : microcline<br>rock : white (grey reflection)<br>powder : white (grey reflection)<br>origin : Buckingham, Québec<br><br>production process:<br>0↑1900 °F (light grey): .50 g + 50 ml nitric acid / soaking: 2 wk. / drying on hot plate (white [light beige reflection]) / irradiated with electrons at 162,431 rad<br>(followed at «light greyish beige») |
| very light beige (orange reflection) | 4942 | mineral : sericite shale<br>rock : light grey (green reflection)<br>powder : very, very light grey<br>origin : Magog, Québec<br><br>production process:<br>1300 °F / 1 h (light orange-beige) / irradiated with gamma[81] rays at 424.7 Mrad |
| very light beige (very light orange tone) | 4943 | mineral : steatite<br>rock : light evergreen<br>powder : white<br>origin : East Broughton, Québec<br><br>production process:<br>2 g of steatite + 2 g of sodium carbonate / 0↑1300 °F + 1 h at 1300 °F<br>(followed at «brownish beige») |
| | | mineral : stibnite<br>rock : dark grey, with blue and silver metallic brilliance<br>powder : dark grey |

| | | |
|---|---|---|
| very light orange-beige | 4944 | origin : Consolidated Durham Mine, Saint-Georges, New Brunswick<br><br>production process:<br>1 g of stibnite + 100 ml sulphuric acid / soaking: 2 wk. / drying on hot plate (white [light beige reflection]) / irradiated with electrons at 162,431 rad |
| orange-beige lightly darker than «very light orange-beige» | 4945 | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 25 ml nitric acid / soaking: 3 d. / drying on hot plate (intense rusty orange): .5 g + 1 cc of white transparent printing ink / mechanical grinding / 1 impression [following a copy of 14 superimpositions] (very light orange-beige) / irradiated with gamma rays at 11.4 Mrad[89,649] |
| beige (light orange tone) darker than «very light orange-beige» | 4946 | mineral : serpentine<br>rock : yellowish green<br>powder : light greenish yellow<br>origin : probably Thetford Mines, Eastern Townships, Québec<br><br>production process:<br>3 g of serpentine + 20 ml hydrofluoric acid / soaking: 24 h / drying in oven at 100 °F (very, very light yellowish beige): .3 g + 50 cc of transparent polyester resin + 1% of catalyst / manual grinding / moulding / hardening (very light cold grey) / irradiated with gamma rays at 11.4 Mrad |
| orange-beige a bit more pale than «light orange-beige» | 4947 | mineral : crocidolite<br>rock : dark greyish blue<br>powder : pale greyish blue<br>origin : Griqualand district, South Africa<br><br>production process:<br>2 g of crocidolite + 2 g of sodium carbonate / 0↑1100 °F + 1 h at 1100 °F (light orange-beige) / irradiated with gamma rays at 190.22 Mrad (followed at «dark beige») |
| | | mineral : mica<br>rock : golden brown, with vitreous luster, translucid |

| | | |
|---|---|---|
| orange-beige a bit more pale than «light orange-beige» | 4948 | powder : light amber, with vitreous luster, translucid<br>origin : Lac Vert mountain, region of Low, near Hincks, Québec<br><br>production process:<br>(followed from «light orange-beige»)<br>2 g of mica + 2 g of sodium carbonate / 0↑1600 °F + 1 h at 1600 °F (orange) / irradiated with electrons at 302,831 rad[45] |
| beige (lighter and more luminous orange tone) less accentuated than «light orange-beige» | 4949 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>25 g of quartz - mica + 100 ml nitric acid / soaking: 5 months / natural drying (light orange-beige) / irradiated with gamma rays at 64.7 Mrad (followed at «dark brownish beige») |
| orange-beige much more pale than «light orange-beige» | 4950 | production process:<br>25 g of quartz - mica + 100 ml nitric acid / soaking: 5 months / natural drying (light orange-beige) / irradiated with electrons at 302,831 rad[36] |
| beige (orange reflection) more pale than «light orange-beige» | 4951 | mineral : sericite shale<br>rock : light grey (green reflection)<br>powder : very, very light grey<br>origin : Magog, Québec<br><br>production process:<br>1300 °F / 1 h (light orange-beige) / irradiated with electrons at 302,831 rad[36] |
| | | mineral : siderite<br>rock : caramel—brown (grey tone)<br>powder : light beige (orange tone)<br>origin : De-Mix quarry, North side of Mont Saint-Hilaire, Rouville county, Québec |

905

| | | |
|---|---|---|
| orange-beige much more pale and less orange than «light orange-beige» | 4952 | production process:<br>powder irradiated with electrons at 302,831 rad[36] |
| orange-beige lighter and less orange than «light orange-beige» | 4953 | production process:<br>powder irradiated with gamma rays at 64.7 Mrad<br><br>(followed at «medium orange [light beige tone]») |
| beige (orange reflection) [between «light orange-beige» and «very light orange-beige»] | 4954 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «light beige [light orange tone]»)<br>2 g of wilsonite + 2 g of sodium carbonate / 0↑1500 °F + 30 min. at 1500 °F (accentuated light green) / irradiated with electrons at 302,831 rad[45] |
| beige (very light orange tone) much lighter than «light orange-beige» | 4955 | mineral : amazonite<br>rock : light greenish turquoise<br>powder : white (turquoise reflection)<br>origin : Lac Sairs, Témiscamingue, Québec<br><br>production process:<br>2 g of amazonite + 2 g of sodium carbonate / 0↑1500 °F + 1 h at 1500 °F (grey a bit darker than «very, very light grey [almost white]») / irradiated with electrons at 162,431 rad |
| beige (light orange | 4956 | mineral : antigorite<br>rock : pale yellowish green<br>powder : very pale greenish yellow<br>origin : Canadian Refractories Mine, Kilmar, Québec<br><br>production process:<br>(followed from «light brownish beige [grey tone]»)<br>2 g of antigorite + 2 g of sodium carbonate / |

| | | |
|---|---|---|
| tone) more light than «light orange-beige» | | 0↑1400 °F + 1 h at 1400 °F<br>(followed at «creamy yellow [light green tone]») |
| orange-beige more light and less orange than «light orange-beige» | 4957 | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : unknown<br><br><u>production process:</u><br>2 g of antigorite + 2 g of sulphur / 1300 °F / 1 h (light orange-beige) / irradiated with gamma rays at 64.7 Mrad<br>(followed at «medium greyish beige [orange reflection]») |
| orange-beige lighter than «light orange-beige» | 4958 | <u>production process:</u><br>2 g of antigorite + 2 g of sulphur / 1300 °F / 1 h (light orange-beige) / irradiated with electrons at 302,831 rad[36] |
| light orange-beige | 4959 | mineral : amazonite<br>rock : greenish turquoise<br>powder : white (turquoise reflection)<br>origin : Lac Saint-Jean, Québec<br><br><u>production process:</u><br>2 g of amazonite + 20 ml nitric acid / soaking: 3 d. / drying on hot plate (light green): .2 g + 50 cc of transparent polyester resin + 1% of catalyst / manual grinding / moulding / hardening (very, very light grey) / irradiated with gamma rays at 5.7 Mrad |
| | | mineral : asbestos[4]<br>rock : dark grey (green reflection)<br>powder : light grey (green reflection)<br>origin : Asbestos Corporation Ltd., Thetford Mines, Québec<br><br>mineral : ochre[20]<br>powder : orange<br>origin : small copper and nickel deposit, in the South-Western area of a mass of serpentinite at 3 km at the West of |

907

| | | |
|---|---|---|
| light orange-beige | 4960 | Saint-Fabien-de-Panet, Québec<br><br>production process:<br>1 g of asbestos + 1 g of ochre / 2000 °F / 45 min.[626] |
| light orange-beige | 4961 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «light yellow»)<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid beige-orange) / irradiated with gamma rays at 244.204 Mrad<br>(followed at «mixture of particles: orange / beige [brown tone] / white») |
| light orange-beige | 4962 | mineral : crocidolite<br>rock : dark greyish blue<br>powder : pale greyish blue<br>origin : Griqualand district, South Africa<br><br>production process:<br>2 g of crocidolite + 2 g of sodium carbonate / 0↑1100 °F + 1 h at 1100 °F<br>(followed at «medium khaki-green [orange-brown tone]») |
| light orange-beige | 4963 | mineral : andulusite<br>rock : light brownish grey<br>powder : light grey<br>origin : Bimbowrie, South Australia<br><br>production process:<br>2 g of andulusite + 2 g of sodium carbonate / 0↑1400 °F + 1 h at 1400 °F (beige [light green tone]) / irradiated with electrons at 162,431 rad<br>(followed at «very light orange-beige») |
| light orange-beige | 4964 | production process:<br>2 g of andulusite + 2 g of sodium carbonate / 0↑1300 °F + 1 h at 1300 °F<br>(followed at «beige») |
| | | mineral : anorthosite<br>rock : light grey |

| | | |
|---|---|---|
| light orange-beige | 4965 | powder : very, very light greyish beige<br>origin : rang Sainte-Germaine, Oka, Québec<br><br>production process:<br>(followed from «grey darker and more accentuated than "light grey"»)<br>rock irradiated with gamma rays at 102.4 Mrad<br>(followed at «light orange-brown») |
| light orange-beige | 4966 | mineral : anorthosite<br>rock : dark grey<br>powder : medium grey<br>origin : Jonquière, Lac Saint-Jean, Québec<br><br>production process:<br>2 g of anorthosite + 2 g of sodium carbonate / 0↑1500 °F + 1 h at 1500 °F (green [between «apple-green» and «mint-green»]) / irradiated with gamma rays at 64.7 Mrad<br>(followed at «greyish beige [green reflection]») |
| light beige (very light orange tone) | 4967 | mineral : antigorite<br>rock : pale yellowish green<br>powder : very pale greenish yellow<br>origin : Canadian Refractories Mine, Kilmar, Québec<br><br>production process:<br>(followed from «creamy yellow [light orange tone] lighter than "creamy yellow [orange tone]"»)<br>2 g of antigorite + 2 g of sodium carbonate / 0↑1500 °F + 45 min. at 1500 °F (creamy yellow [green tone] more accentuated than «creamy yellow [light green tone]») / irradiated with electrons at 302,831 rad[45] |
| light orange-beige | 4968 | production process:<br>2 g of antigorite + 20 ml hydrochloric acid / soaking: 3 d. / drying on hot plate (light orange-yellow) / irradiated with gamma rays at 64.7 Mrad<br>(followed at «light beige-orange») |
| light orange-beige | 4969 | production process:<br>(followed from «very light orange-beige»)<br>2 g of antigorite + 2 g of sodium carbonate / 0↑1500 °F + 30 min. at 1500 °F (creamy yellow [localized light green tone]) / irradiated with electrons at 302,831 rad[45,650] |
| light orange-beige | 4970 | production process:<br>2 g of antigorite + 2 g of sodium carbonate / |

| | | |
|---|---|---|
| | | 0↑1500 °F + 1 h at 1500 °F (intense olive-green) / irradiated with electrons at 162,431 rad (followed at «dark orange-beige») |
| light orange-beige | 4971 | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : unknown<br><br>production process:<br>2 g of antigorite + 2 g of sulphur / 1300 °F / 1 h |
| light beige (very, very light orange tone) | 4972 | mineral : apatite<br>rock : light grass-green (light blue and yellow tones), very slightly translucid<br>powder : very light grey (light green tone)<br>origin : region of Buckingham, Québec<br><br>production process:<br>.2 g of apatite + 50 cc of transparent polyester resin + 1% of catalyst / manual grinding / moulding / hardening (very, very light grey [very light green reflection]) / irradiated with gamma rays at 5.7 Mrad |
| light orange-beige | 4973 | mineral : apatite<br>rock : pale brownish green<br>powder : very light greyish green<br>origin : Black Lake, Thetford county, Québec<br><br>production process:<br>2 g of apatite + 25 ml hydrochloric acid / soaking: 24 h / drying on hot plate (orange[24]): .3 g + 50 cc of transparent polyester resin + 1% of catalyst / manual grinding / moulding / hardening (very light grey) / irradiated with gamma rays at 11.4 Mrad |
| light beige (light orange tone) | 4974 | production process:<br>.3 g of apatite + 50 cc of transparent polyester resin + 1% of catalyst / manual grinding /moulding / hardening (very, very light grey) / irradiated |

| | | |
|---|---|---|
| | | with gamma rays at 11.4 Mrad |
| light beige (very light orange tone) | 4975 | mineral : apatite<br>rock : pale brownish green<br>powder : very light greyish green<br>origin : Black Lake, Thetford county, Québec<br><br>mineral : sulphur<br>rock : brilliant yellow<br>powder : brilliant yellow<br>origin : unknown<br><br>production process:<br>2 g of apatite + 2 g of sulphur / 1300 °F / 1 h |
| light orange-beige<br>↓<br>orange-beige more accentuated than «light orange-beige» | 4976<br><br>4977 | mineral : barite<br>rock : pinkish white<br><br>powder : white<br>origin : Niobec Mine, Saint-Honoré, Saguenay, Québec<br><br>production process:<br>(followed from «pinkish beige [grey tone]»)<br>powder irradiated with gamma[36] rays at:<br>287.3 Mrad<br><br>360 Mrad<br><br>(followed at «medium orange-beige») |
| light orange-beige slightly more accentuated<br>\|<br>equivalent light orange-beige<br>↓<br>orange-beige a bit more accentuated | 4978<br><br><br>4979<br><br>4980 | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «light beige [pinkish orange tone]»)<br>0↑1300 °F<br><br>0↑1400 °F<br><br>0↑1500 °F<br>(followed at «medium beige [pinkish orange tone]») |

| | | |
|---|---|---|
| light, luminous orange-beige | 4981 | mineral : calcite<br>rock : light pink<br>powder : pinkish white<br>origin : Huddersfield district, Pontiac county Québec<br><br>production process:<br>(followed from «greyish brown»)<br>1600 °F / 1 h (greyish brown or brownish grey [be-[tween «dark greyish brown or brownish grey» and «blackish greyish brown or brownish grey»]) / rock irradiated with gamma rays at 424.7 Mrad |
| light orange-beige | 4982 | mineral : chrysocolla<br>rock : light greenish turquoise<br>powder : very light greenish turquoise<br>origin : Mexico<br><br>production process:<br>(followed from «lemon-yellow more intense than "light and vivid lemon-yellow"»)<br>2 g of chrysocolla + 25 ml hydrochloric acid / natural drying (colour of the solid[409]: light and vivid lemon-yellow) / irradiated with gamma rays at 424.7 Mrad |
| | | mineral : cement[82]<br>powder : medium cold grey<br>origin : Union des Carrières, Limoilou, Québec<br><br>production process:<br>2 g of cement + 2 g of sodium carbonate: |
| light beige (light orange tone) | 4983 | 0↑1500 °F + 1 h at 1500 °F |
| light beige (light orange tone) | 4984 | 0↑1600 °F + 1 h at 1600 °F |
| light beige (light orange tone) | 4985 | 0↑1700 °F + 1 h at 1700 °F |
| light beige (light orange tone) | 4986 | 0↑1800 °F + 1 h at 1800 °F |
| ↓<br>light beige (light orange tone) | 4987 | 0↑1900 °F + 1 h at 1900 °F |
| | | mineral : cryolite<br>rock : white, crystalline and translucid<br>powder : white |

| | | |
|---|---|---|
| | | origin : Ivigtut, Groenland<br><br>production process:<br>(followed from «light beige»)<br>powder irradiated with gamma rays at: |
| light beige (orange | 4988 | 148.4 Mrad |
| reflection) which | 4989 | 201.6 Mrad |
| ↓ | 4990 | 247.6 Mrad |
| darkens | 4991 | 287.3 Mrad |
| ↓ | 4992 | 360 Mrad |
| | | (followed at «medium orange-beige») |
| light beige (light orange tone) | 4993 | mineral : diopside<br>rock : light grey<br>powder : light beige<br>origin : Mont Orford, Québec<br><br>production process:<br>(followed from «very light beige»)<br>1 g of diopside + 50 ml sulphuric acid / soaking: 2 wk. / drying on hot plate (white [light beige reflection]) / irradiated with gamma rays at 424.7 Mrad |
| light orange-beige | 4994 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>.2 g of fluorine + 50 cc of transparent polyester resin + 1% of catalyst / manual grinding / moulding / hardening (greenish grey) / irradiated with gamma rays at 5.7 Mrad |
| light orange-beige | 4995 | production process:<br>1000 °C / 1 h |
| | | mineral : honey grossular garnet<br>rock : light pinkish beige<br>powder : very light beige<br>origin : Jeffrey Mine, Asbestos (presently J.-M. Asbestos), Québec<br><br>production process:<br>rock irradiated with gamma[67,73] rays at: |
| light beige (orange tone fairly pronounced)<br>↓ | 4996 | 5 Mrad |
| light beige (orange | 4997 | 10 Mrad |

| | | |
|---|---|---|
| tone fairly pronounced) | | (followed at «beige / orange») |
| light beige (very light orange tone) | 4998 | mineral : sandstone<br>rock : medium pinkish brown (light violet tone)<br>powder : medium pinkish brown (light violet tone)<br>origin : at the rear of Percé, Gaspésie, Québec<br><br>production process:<br>2 g of sandstone + 2 g of sodium carbonate / 0↑1500 °F + 15 min. at 1500 °F (orange) / irradiated with gamma rays at 64.7 Mrad<br>(followed at «medium brownish beige») |
| light beige (light orange tone) | 4999 | production process:<br>2 g of sandstone + 2 g of sodium carbonate / 0↑1500 °F + 15 min. at 1500 °F (orange) / irradiated with electrons at 162,431 rad<br>(followed at «very pale beige») |
| light beige (accentuated orange tone) | 5000 | mineral : gypsum<br>rock : white (yellow reflection)<br>powder : white (yellow reflection)<br>origin : Geisborough, Nova Scotia<br><br>production process:<br>(followed from «white [yellow reflection]»)<br>powder irradiated with gamma rays at 604.53 Mrad |
| light orange-beige | 5001 | production process:<br>(followed from «very light beige»)<br>2 g of gypsum + 20 ml hydrochloric acid / soaking: 3 d. / drying on hot plate (chalk-white [light yellow reflection]) / irradiated with gamma rays at 424.7 Mrad |
| light orange-beige | 5002 | mineral : kaolin<br>rock : chalk-white (yellow reflection)<br>powder : chalk-white (yellow reflection)<br>origin : Saint-Rémi d'Amherst, Québec<br><br>production process:<br>2 g of kaolin + 2 g of sodium carbonate / 0↑1500 °F + 1 h at 1500 °F (very light orange) / irradiated with electrons at 302,831 rad[36] |
| | | mineral : mica<br>rock : golden brown, with vitreous luster, translucid |

914

| | | |
|---|---|---|
| light orange-beige | 5003 | powder : light amber, with vitreous luster, translucid<br>origin : Lac Vert mountain, region of Low, near Hincks, Québec<br><br><u>production process:</u><br>2 g of mica + 2 g of sodium carbonate / 0↑1600 °F + 1 h at 1600 °F (orange) / irradiated with electrons at 162,431 rad<br>(followed at «orange-beige more pale than "light orange-beige"») |
| light orange-beige | 5004 | mineral : mussel shell or calcium carbonate<br>shell : dark indigo-blue (violet tone)<br>powder : white<br>origin : St.-Lawrence river, Baie-des-Chaleurs, Gaspésie, Québec<br><br><u>production process:</u><br>.50 g of powder + 50 ml nitric acid / soaking: 2 wk. / drying on hot plate (very, very light orange) / irradiated with electrons at 302,831 rad[34] |
| | | mineral : olivine<br>rock : light grey, crystalline<br>powder : very light grey<br>origin : Mont Albert, Gaspésie, Québec<br><br><u>production process:</u><br>(followed from «light greenish grey [light orange tone]») |
| light orange-beige<br>↓ | 5005 | 0↑1200 °F |
| orange-beige (more accentuated orange tone) | 5006 | 0↑1300 °F<br><br>(followed at «reddish orange») |
| light beige (very light orange tone) | 5007 | mineral : olivine<br>powder : colourless (green reflection)<br>origin : Mount Haven, United States<br><br><u>production process:</u><br>3 g of olivine + 20 ml hydrofluoric acid / soaking: 24 h / drying in oven at 100 °F (light cream [light orange tone]): .2 g + 50 cc of transparent polyester resin + 1% of catalyst / manual grinding / moulding / hardening (light grey [very light yellow reflection]) / irradiated with gamma rays at 5.7 Mrad |
| | | <u>production process:</u><br>30 g of olivine + 100 ml sulphuric acid / soaking: |

| | | |
|---|---|---|
| light orange-beige<br>↓<br>light beige<br>(orange reflection) | 5008<br><br>5009 | 24 h / drying on hot plate (light cream [light orange tone]) / irradiated with electrons at:<br>162,431 rad<br><br>302,831 rad[45,651] |
| light orange-beige | 5010 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «light yellowish beige»)<br>1 g of ochre + 2 g of titanium dioxide / 0↑1750 °F / slow cooling in furnace |
| light beige (very light orange tone) | 5011 | mineral : pyrochlore<br>powder : reddish brown<br>origin : De-Mix quarry, North side of Mont Saint-Hilaire, Rouville county, Québec<br><br>production process:<br>.40 g of pyrochlore + 50 ml sulphuric acid / soaking: 2 wk. / drying on hot plate (white [pinkish cream reflection]) / irradiated with gamma rays at 64.7 Mrad<br>(followed at «dark milky chocolate-brown [light orange tone]») |
| light orange-beige | 5012 | production process:<br>.40 g of pyrochlore + 50 ml sulphuric acid / soaking: 2 wk. / drying on hot plate (white [pinkish cream reflection]) / irradiated with electrons at 162,431 rad |
| light orange-beige | 5013 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>25 g of quartz - mica + 100 ml nitric acid / soaking: 5 months / natural drying |

| | | |
|---|---|---|
| light orange-beige | 5014 | <u>production process:</u><br>2 g of quartz - mica + 2 g of sodium carbonate / 0↑1600 °F + 1 h at 1600 °F (orange-beige) / irradiated with gamma rays at 63.88 Mrad<br>(followed at «greyish beige a bit darker than "light greyish beige"») |
| light orange-beige | 5015 | <u>production process:</u><br>2 g of quartz - mica + 2 g of sodium carbonate / 0↑1600 °F + 1 h at 1600 °F (orange-beige) / irradiated with electrons at 162,431 rad<br>(followed at «very light orange-beige [yellow tone]») |
| | | mineral : rutile<br>powder : dark brown (orange-red reflection)<br>origin : North Stradbroke Island, Queensland, Australia |
| light orange-beige | 5016 | <u>production process:</u><br>.40 g of rutile + 50 ml sulphuric acid / soaking: 2 wk. / drying on hot plate (mixture of particles: white / brown) / irradiated with gamma rays at 70.4 Mrad<br>(followed at «dark milky chocolate-brown [light orange tone]») |
| | | mineral : sericite shale<br>rock : light grey (green reflection)<br>powder : very, very light grey<br>origin : Magog, Québec |
| | | <u>production process:</u><br>(followed from «light yellowish beige»)<br>2 g of sericite shale + 2 g of sodium carbonate: |
| light beige (very light orange tone) | 5017 | 0↑1500 °F + 15 min. at 1500 °F |
| ↓ | | |
| light beige (very light orange tone) | 5018 | 0↑1500 °F + 30 min. at 1500 °F |
| ↓ | | |
| light beige (very light orange tone) | 5019 | 0↑1500 °F + 45 min. at 1500 °F<br>(followed at «light yellowish beige») |
| light orange-beige | 5020 | <u>production process:</u><br>1300 °F / 1 h |
| | | mineral : serandite<br>rock : beige (light pinkish orange tone), opaque<br>powder : light pink<br>origin : De-Mix quarry, North side of Mont Saint-Hilaire, Rouville county, |

| | | |
|---|---|---|
| light orange-beige | 5021 | Québec<br><br><u>production process:</u><br>(followed from «pinkish beige»)<br>12 g of serandite + 40 ml sulphuric acid / soaking: 33 d. / drying on hot plate (very, very light beige [almost white]) / irradiated with gamma rays at 424.7 Mrad |
| light orange-beige | 5022 | mineral : steatite<br>rock : light evergreen<br>powder : white<br>origin : East Broughton, Québec<br><br><u>production process:</u><br>3 g of steatite + 25 ml hydrochloric acid / soaking: 3 d. / drying on hot plate |
| light beige (very light orange tone) | 5023 | <u>production process:</u><br>2 g of steatite + 2 g of sodium carbonate / 0↑1300 °F + 1 h at 1300 °F (very light beige [very light orange tone]) / irradiated with gamma rays at 423.88 Mrad[262] |
| light beige (light orange tone)<br>↓ | 5024 | mineral : tremolite<br>rock : medium brown (evergreen tone)<br>powder : greyish beige<br>origin : Tetreault Mine, Montauban, Portneuf county, Québec<br><br><u>production process:</u><br>(followed from «greyish brown or brownish grey»)<br>2 g of tremolite + 2 g of sodium carbonate:<br>0↑1300 °F + 1 h at 1300 °F |
| beige (light orange tone) a bit darker<br>↓ | 5025 | 0↑1400 °F + 30 min. at 1400 °F |
| beige (light orange tone) still a bit darker | 5026 | 0↑1400 °F + 1 h at 1400 °F<br><br>(followed at «greenish beige») |
| | | mineral : wilsonite, local variety of scapolite or wernerite<br>rock : grey (violet tone)<br>powder : light grey (lilac tone)<br>origin : Tetreault Mine, Montauban, Portneuf county, Québec |

| | | |
|---|---|---|
| light beige (light orange tone) | 5027 | <u>production process:</u> 2 g of wilsonite + 2 g of sodium carbonate / / 0↑1500 °F + 30 min. at 1500 °F (accentuated light green) / irradiated with electrons at 162,431 rad (followed at «orange-beige [between "light orange-beige" and "very light orange-beige"]») |
| beige (very light orange tone) a bit darker than «light orange-beige» | 5028 | mineral : actinolite<br>rock : light and cold evergreen<br>powder : light grey (light green tone)<br>origin : erratic block found at Saint-Philémon, near Dorchester, Québec<br><br><u>production process:</u> 2 g of actinolite + 2 g of sodium carbonate / 0↑1500 °F + 1 h at 1500 °F (beige [very light orange tone]) / irradiated with gamma rays at 64.7 Mrad (followed at «medium brownish beige») |
| light orange-beige more intense than «orange-beige darker than "light orange-beige"» | 5029 | mineral : serpentine<br>rock : yellowish green<br>powder : light greenish yellow<br>origin : probably Thetford Mines, Eastern Townships, Québec<br><br><u>production process:</u> (followed from «orange-beige darker than "light orange-beige"») 3 g of serpentine + 25 ml hydrochloric acid / soaking: 24 h / drying on hot plate (brownish orange): .3 g + 50 cc of transparent polyester resin + 1% of catalyst / manual grinding / moulding / hardening (light beige [light orange reflection]) / irradiated with electrons at 305,072 rad[354] |
| orange-beige darker than «light orange-beige» | 5030 | mineral : antigorite<br>rock : pale yellowish green<br>powder : very pale greenish yellow<br>origin : Canadian Refractories Mine, Kilmar, Québec<br><br><u>production process:</u> 1000 °C / 1 h (light orange-chamois) / powder irradiated with gamma rays at 64.7 Mrad (followed at «medium beige-orange») |
| | | mineral : calcite[11]<br>powder : white |

| | | |
|---|---|---|
| | | origin : Calcite du Nord Company, Saint-Eugène de Mistassini, Lac Saint-Jean, Québec<br><br>production process:<br>4 g of calcite + 25 ml sulphuric acid / soaking: 24 h / drying on hot plate (very light beige): .3 g + 50 cc of transparent polyester resin + 1% of catalyst / manual grinding / moulding / hardening (light beige [light yellow reflection]) / irradiated with gamma rays at 5.7 Mrad |
| orange-beige a bit darker than «light orange-beige» | 5031 | |
| | | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>35 g of ochre + 100 ml hydrochloric acid / soaking: 5 months / natural drying (orange [light brown tone]): .3 g + 50 cc of transparent polyester resin + 1% of catalyst / manual grinding / moulding / hardening (light orange-beige) / irradiated with electrons at: |
| orange-beige darker than «light orange-beige»<br>↓ | 5032 | 155,082 rad |
| orange-beige more intense and more orange than «light orange-beige» | 5033 | 305,082 rad[354] |
| | | mineral : serpentine<br>rock : yellowish green<br>powder : light greenish yellow<br>origin : probably Thetford Mines, Eastern Townships, Québec<br><br>production process:<br>3 g of serpentine + 25 ml hydrochloric acid / soaking: 24 h / drying on hot plate (brown-orange): .3 g + 50 cc of transparent polyster resin + 1% of catalyst / manual grinding / moulding / hardening (light beige [light orange reflection]) / irradiated with electrons at 155,082 rad |
| beige (light orange tone) darker than «light orange-beige» | 5034 | |

920

| | | |
|---|---|---|
| | | (followed at «light and intense orange-beige») |
| beige (light orange tone) darker than «light orange-beige» | 5035 | <u>production process:</u><br>3 g of serpentine + 25 ml nitric acid / soaking: 24 h / separation of the liquid and the solid / drying on hot plate (colour of the solid: light beige): .3 g + 50 cc of transparent polyester resin (light orange-beige) / irradiated with gamma rays at 5.7 Mrad |
| orange-beige darker than «light orange-beige» | 5036 | mineral : steatite<br>rock : light evergreen<br>powder : white<br>origin : East Broughton, Québec<br><br><u>production process:</u><br>3 g of steatite + 25 ml hydrochloric acid / soaking: 3 d. / drying on hot plate (light orange-beige) / irradiated with gamma rays at 63.88 Mrad (followed at «dark brownish beige [grey tone]») |
| orange-beige more pale than «orange-beige» | 5037 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>(followed from «orange-beige»)<br>1 g of calcite + 1 cc of white transparent synthetic enamel paint used for the car / manual grinding / application on a piece of steel sheet used for the car's body measuring 1" x 1" (light yellowish cream) / irradiated with gamma rays at 360 Mrad[351,352] |
| beige (light orange tone) lighter than «orange-beige» | 5038 | mineral : spodumene<br>rock : pale green<br>powder : light grey, almost white<br>origin : Québec Lithium Co., Baraute, Abitibi, Québec<br><br><u>production process:</u><br>(followed from «pinkish beige»)<br>2 g of spodumene + 2 g of sodium carbonate / 0↑1400 °F + 1 h at 1400 °F[652]<br>(followed at «mixture of particles: olive-green / brown») |
| | | mineral : actinolite |

| | | |
|---|---|---|
| beige (very light orange tone) | 5039 | rock : light and cold evergreen<br>powder : light grey (light green tone)<br>origin : erratic block found at Saint-Philémon, near Dorchester, Québec<br><br>production process:<br>(followed from «light beige»)<br>2 g of actinolite + 2 g of sodium carbonate / 0↑1500 °F + 1 h at 1500 °F<br>(followed at «brown») |
| beige (light orange tone) | 5040 | mineral : agate<br>rock : dark grass-green, slightly translucid<br>powder : light grey (light green tone)<br>origin : bank of St.-Lawrence river, region of Maria, Gaspésie, Québec<br><br>production process:<br>2000 °F / 45 min. |
| orange-beige | 5041 | production process:<br>(followed from «very light creamy beige»)<br>1 g of agate + 1 cc of white opaque synthetic enamel paint used for the car / manual grinding / application on a piece of steel sheet used for the car's body measuring 1" x 1" (very, very light greyish green [almost white]) / irradiated with gamma rays at 201.6 Mrad<br><br>(followed at «orange») |
| beige (light orange-beige) | 5042 | mineral : agate<br>rock : dark grass-green, slightly translucid<br>powder : light grey (light green tone)<br>origin : bank of St.-Lawrence river, region of Maria, Gaspésie, Québec<br><br>mineral : nickel<br>powder : dark brownish grey, with metallic brilliance<br><br>production process:<br>1 g of agate + 1 g of nickel / 2000 °F / 45 min. |
| | | mineral : Gaspé agate<br>rock : marbled nodule with shaded tints of white, pink and light grey, slightly translucid<br>powder : very light pinkish grey<br>origin : Mont Lyall, Gaspésie, Québec |

| | | |
|---|---|---|
| orange-beige | 5043 | <u>production process:</u><br>4 g of agate + 40 ml hydrochloric acid / soaking: 1 wk. / separation of the liquid and the solid / natural drying (colour of the liquid: apple-green [orange tone]) / irradiated with electrons at 305,200 rad[46] |
| orange-beige | 5044 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>50 g of asbestos + 200 ml hydrochloric acid <u>or</u> asbestos entirely covered with hydrochloric acid / soaking: 1 wk. / drying on hot plate (vivid yellow): .50 g + .50 g of sodium carbonate (light and vivid beige-orange) + 40 ml nitric acid / soaking: 5 d. / separation of the liquid and the solid / drying on sand bath[653] / colour of the solid[653a] |
| orange-beige | 5045 | <u>production process:</u><br>(followed at «dark beige [orange-pink tone]»)<br>50 g of asbestos + 200 ml hydrochloric acid <u>or</u> asbestos entirely covered with hydrochloric acid / soaking: 1 wk. / drying on hot plate (vivid yellow): 3 g + 2 g of sodium carbonate / 0↑1600 °F (followed at «mixture of particles: orange / greenish turquoise») |
| orange-beige | 5046 | <u>production process:</u><br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]) / irradiated with electrons at 162,431 rad |
| orange-beige | 5047 | <u>production process:</u><br>5 g of asbestos + 100 ml sulphuric acid / soaking: 2 wk. / drying on hot plate (almost pure white [light yellow reflection]) / irradiated with electrons at 162,431 rad |
| orange-beige | 5047.1 | <u>production process:</u><br>(followed from «apple-green» and «beige»)<br>3 g of asbestos + 20 ml hydrochloric acid + 5 ml water / soaking: 5 d. / drying in oven at 100 °F (orange-yellow): .3 g + 50 cc of transparent |

| | | |
|---|---|---|
| ↓ | | polyester resin + 10 drops of catalyst / manual grinding / moulding / deposited in a furnace used for plastics at 100 °F until it is hardened |
| orange-beige | 5047.2 | 3 g of asbestos + 10 ml hydrochloric acid + 15 ml water / soaking: 5 d. / drying in oven at 100 °F (orange-yellow): .3 g + 50 cc of transparent polyester resin + 8 drops of catalyst / manual grinding / moulding / deposited in a furnace used for plastics at 100 °F until it is hardened |
| orange-beige | 5048 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br><br>production process:<br>(followed from «medium beige [pinkish orange tone]»)<br>50 g of asbestos + 200 ml hydrochloric acid or asbestos entirely covered with hydrochloric acid / soaking: 1 wk. / drying on hot plate (vivid yellow): .50 g + .50 g of titanium dioxide / 1600 °F / 1 h<br>(followed at «chamois») |
| orange-beige | 5049 | mineral : apophyllite<br>rock : milky white, translucid<br>powder : white<br>origin : Gaspé Copper Mine, Gaspé, Québec<br><br>production process:<br>1 g of apophyllite + 60 ml nitric acid / soaking: 2 wk. / drying on hot plate (light orange) / irradiated with electrons at 162,431 rad |
| orange-beige (with light apple-green areas) | 5050 | production process:<br>1 g of apophyllite + 60 ml hydrochloric acid / soaking: 2 wk. / drying on hot plate (light orange-yellow) / irradiated with electrons at 162,431 |
| | | mineral : bauxite[92]<br>powder : pinkish beige, mat<br>origin : Alcan Company, French Guyana |

| | | |
|---|---|---|
| orange-beige | 5051 | <u>production process:</u><br>(followed from «greenish beige»)<br>2 g of bauxite + 5 ml hydrochloric acid + 20 ml water / soaking: 4-5 d. / drying on hot plate |
| orange-beige | 5052 | mineral : beryl<br>rock : light blue, slightly translucid<br>powder : light grey<br>origin : Abitibi, Québec<br><br><u>production process:</u><br>.3 g of beryl + 50 cc of transparent polyester resin + 1% of catalyst / manual grinding / moulding / hardening (very light grey) / irradiated with gamma rays at 5.7 Mrad |
| orange-beige | 5053 | mineral : bornite<br>rock : reddish brown (with localized green and bluish green oxidation)<br>powder : reddish brown<br>origin : Lac Musset, Fosse du Labrador, Québec<br><br><u>production process:</u><br>2 g of bornite + 25 ml hydrochloric acid / soaking: 6 d. / separation of the liquid and the solid / natural drying (colour of the solid: light yellowish green) / irradiated with electrons at 164,800 rad<br>(followed at «orange-brown») |
| orange-beige | 5054 | <u>production process:</u><br>12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath (colour of the solid: pale greyish green [orange tone]) / irradiated with electrons at 164,800 rad (followed at «orange-beige [green reflection] darker than "orange-beige [green reflection]"») |
| | | mineral : calcite (with clayey inclusions)<br>rock : very light creamy yellow, translucid<br>powder : white<br>origin : De-Mix quarry, near Saint-Philippe de Laprairie, Québec |

| | | |
|---|---|---|
| orange-beige | 5055 | production process:<br>(followed from «creamy beige»)<br>1 g of calcite + 1 cc of white transparent synthetic enamel paint used for the car / manual grinding / applied on a piece of steel sheet used for the car's body measuring 1" x 1" (light yellowish cream) / irradiated with gamma rays at 102.4 Mrad (followed at «orange-beige more pale than "orange-beige"») |
| | | mineral : calcite<br>rock : light pink<br>powder : pinkish white<br>origin : Huddersfield district, Pontiac county, Québec<br><br>production process:<br>(followed from «beige»)<br>1 g of calcite + 1 cc of white transparent synthetic enamel paint used for the car / manual grinding / applied on a piece of steel sheet used for the car's body measuring 1" x 1" (cream) / irradiated with gamma rays at: |
| beige (light orange tone)<br>↓ | 5056 | 57.4 Mrad |
| orange-beige with orange tone | 5057 | 102.4 Mrad |
| which accentuates | 5058 | 201.6 Mrad |
| ↓ | 5059 | 247.6 Mrad |
| itself | 5060 | 360 Mrad |
| | | mineral : solid epidote<br>rock : brownish green<br>powder : brownish green<br>origin : James Bay, Québec |
| orange-beige | 5061 | production process:<br>0↑1700 °F (dark reddish brown): 1 g + 40 ml hydrochloric acid / soaking: 1 wk. / separation of the liquid and the solid / natural drying (colour of the solid: rusty orange) / irradiated with electrons at 164,800 rad<br>(followed at «medium orange-brown») |
| | | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid / stick measuring 1/2" x 4 7/8" x |

| | | |
|---|---|---|
| | | 1/8"; weighing 15 g<br>powder : light grey<br>origin : East Broughton, Québec<br><br><u>production process:</u> |
| orange-beige<br>↓ | 5062 | 4 g of powdered galena deposited on a stick of steatite / 1400 °F / 1 h («orange» glaze [on a «golden beige» steatite at its surface and «dark iron-grey» steatite in its depth]) / irradiated with gamma rays at 64.7 Mrad / colour of the glaze[654]<br>(followed at «marbled and mat grey», and «iron-grey darker than "dark iron-grey"», and «dark brownish grey» and «brown») |
| orange-beige | 5063 | 4 g of powdered galena deposited on a stick of steatite / 1500 °F / 1 h («orange glaze [with small green spots]» on a «golden beige» steatite at its surface and «dark iron-grey» steatite in its depth]) / irradiated with gamma rays at 64.7 Mrad / colour of the glaze[654]<br>(followed at «mat brownish grey», and «brown», and «iron-grey darker than "dark iron-grey"» and «dark iron-grey») |
| | | mineral : biotite gneiss<br>rock : blackish grey, golden vitreous brilliance<br>powder : dark grey<br>origin : Grenville geological province, Québec<br><br><u>production process:</u> |
| orange-beige | 5064 | 1600 °F / 15 h (mat and medium orange-pink): .50 g + 40 ml hydrochloric acid / natural drying (medium rusty orange) / irradiated with electrons at 164,800 rad<br>(followed at «medium brownish orange») |
| | | mineral : graphite<br>rock : dark grey, with metallic brilliance<br>powder : dark grey, with metallic brilliance<br>origin : Grenville, Québec<br><br><u>production process:</u> |
| orange-beige | 5065 | 1 g of graphite + 1 g of sodium carbonate / 1800 °F / 1 h (intense emerald-green) / irradiated with electrons at 162,431 rad |
| | | mineral : honey grossular garnet<br>rock : light pinkish beige<br>powder : very light beige<br>origin : Jeffrey Mine, Asbestos (presently J.-M. Asbestos), Québec |

| | | |
|---|---|---|
| orange-beige | 5066 | production process:<br>(followed from «caramel-beige [orange tone]»)<br>rock irradiated with gamma[67,73] rays at 102.4 Mrad[655]<br>(followed at «beige / orange») |
| beige (light orange tone) | 5067 | production process:<br>(followed from «rusty orange»)<br>1 g of garnet + 1 cc of white transparent synthetic enamel paint used for the car / manual grinding / applied on a piece of steel sheet used for the car's body measuring 1" x 1" (very pale beige) / irradiated with gamma rays at 360 Mrad[351,352] |
| beige (light orange tone) | 5068 | mineral : kaolin<br>rock : chalk-white (yellow reflection)<br>powder : chalk-white (yellow reflection)<br>origin : Saint-Rémi d'Amherst, Québec<br><br>production process:<br>(followed from «very light orange»)<br>2 g of kaolin + 2 g of sodium carbonate / 0↑1600 °F + 1 h at 1600 °F<br>(followed at «orange darker than "very light orange"») |
| orange-beige | 5069 | mineral : mica<br>rock : golden brown, with vitreous luster, translucid<br>powder : light amber, with vitreous luster, translucid<br>origin : Lac Vert Mountain, region of Low, near Hincks, Québec<br><br>mineral : sulphur<br>rock : brilliant yellow<br>powder : brilliant yellow<br>origin : unknown<br><br>production process:<br>2 g of mica + 2 g of sulphur / 1400 °F / 1 h |
| beige (light orange tone) | 5070 | mineral : olivine<br>rock : light grey, crystalline<br>powder : very light grey<br>origin : Mont Albert, Gaspésie, Québec<br><br>production process:<br>0↑1800 °F (reddish orange): 1 g + 80 ml hydrochloric acid / soaking: 2 wk. / drying on hot plate |

| | | |
|---|---|---|
| beige (light orange tone) | 5071 | mineral : orthoclase<br>rock : light pinkish beige<br>powder : very light beige<br>origin : mine near Buckingham, Papineau county, Québec<br><br>mineral : sulphur<br>rock : brilliant yellow<br>powder : brilliant yellow<br>origin : unknown<br><br>production process:<br>2 g of orthoclase + 2 g of sulphur / 1300 °F / 1 h |
| beige (light orange reflection) | 5072 | mineral : orthoclase<br>rock : light pinkish beige<br>powder : very light beige<br>origin : mine near Buckingham, Papineau county, Québec<br><br>production process:<br>.3 g of orthoclase + 50 cc of transparent polyester resin + 1% of catalyst / manual grinding / moulding / hardening (very light grey) / irradiated with gamma rays at 11.4 Mrad |
| orange-beige or beige-orange | 5073 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>3 g of ochre + 20 ml hydrofluoric acid / soaking: 24 h / drying in oven at 100 °F (medium brownish grey): .3 g + 50 cc of transparent polyester resin + 1% of catalyst / manual grinding / moulding / hardening (pale beige [light orange reflection]) / irradiated with gamma rays at 11.4 Mrad |
| orange-beige | 5074 | production process:<br>35 g of ochre + 100 ml hydrochloric acid / soaking: 5 months / natural drying (orange [light brown tone]): .3 g + 50 cc of transparent polyester resin + 1% of catalyst / manual grinding / moulding / hardening (light orange-beige) / irradiated with gamma rays at 5.7 Mrad |
| | | mineral : ochre[111] |

| | | |
|---|---|---|
| | | powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u><br>(followed from «medium beige-orange») |
| orange-beige | 5075 | 1 g of ochre + 1 g of zirconium silicate + 1 g of titanium dioxide / 0↑1700 °F<br>(followed at «beige-orange») |
| | | mineral : peridotite<br>rock : medium grey<br>powder : medium brownish grey (green reflection)<br>origin : Thetford Mines, Québec<br><br><u>production process:</u><br>(followed from «beige») |
| orange-beige | 5076 | 2 g of peridotite + 2 g of sodium carbonate / 0↑1500 °F + 1 h at 1500 °F<br>(followed at «beige [reddish orange tone]») |
| | | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>(followed from «beige»)<br>2 g of quartz - mica + 2 g of sodium carbonate: |
| beige (light orange tone)<br>↓ | 5077 | 0↑1400 °F + 1 h at 1400 °F |
| orange-beige<br>↓ | 5078 | 0↑1500 °F + 1 h at 1500 °F |
| beige (orange tone still more accentuated) | 5079 | 0↑1600 °F + 1 h at 1600 °F<br>(followed at «light green») |
| | | mineral : shale (formation of Sillery[359])<br>rock : brownish red<br>powder : pinkish brown, mat<br>origin : bank of St.-Lawrence river at |

| | | |
|---|---|---|
| | | Berthier-Sur-Mer, at the rear of the Dénechaud manor, Québec<br><br>production process: |
| orange-beige | 5080 | 2 g of shale + 2 g of sodium carbonate / 0↑1500 °F + 1 h at 1500 °F<br>(followed at «light beige [orange-pink tone]») |
| | | mineral : sericite shale<br>rock : light grey (green reflection)<br>powder : very, very light grey<br>origin : Magog, Québec<br><br>mineral : calcite[11]<br>powder : white<br>origin : Calcite du Nord Company, Saint-Eugène de Mistassini, Lac Saint-Jean, Québec<br><br>production process: |
| beige (light orange tone) | 5081 | 1 g of shale + 1 g of calcite / 1000 °C / 1 h |
| | | mineral : serandite<br>rock : orange-pink or salmon (with more orange areas)<br>powder : pinkish white<br>origin : De-Mix quarry, North side of Mont Saint-Hilaire, Rouville county, Québec<br><br>production process: |
| orange-beige | 5082 | 2 g of serandite + 20 ml hydrochloric acid / soaking: 3 d. / drying on hot plate |
| | | mineral : siderite<br>rock : caramel—brown (grey tone)<br>powder : light beige (orange tone)<br>origin : De-Mix quarry, North side of Mont Saint-Hilaire, Rouville county, Québec<br><br>production process:<br>(followed from «light beige [orange-pink tone]») |
| orange-beige | 5083 | 1 g of siderite + 1 cc of white opaque synthetic enamel paint used for the car / manual grinding / applied on a piece of steel sheet used for the car's body measuring 1" x 1" (dark creamy beige) / irradiated with gamma rays at 102.4 Mrad[656]<br>(followed at «2 areas: brown / cream») |
| | | mineral : steatite |

931

| | | |
|---|---|---|
| | | rock : light cold grey, slightly translucid<br>powder : light grey<br>origin : East Broughton, Québec |
| | | production process:<br>(followed from «brownish beige») |
| orange-beige | 5084 | 0↑1700 °F (beige [light orange tone]): 2 g + 25 ml nitric acid / soaking: 3 d. / drying on hot plate |
| beige (accentuated orange tone) | 5085 | 0↑1800 °F (beige [accentuated orange tone]): 2 g + 25 ml nitric acid / soaking: 3 d. / drying on hot plate |
| ↓ | | |
| beige (orange tone still more accentuated) | 5086 | 0↑1900 °F (beige [orange tone still more accentuated]): 2 g + 25 ml nitric acid / soaking: 3 d. / drying on hot plate |
| beige (very light orange tone) | 5087 | production process:<br>30 g of steatite + 50 ml nitric acid / soaking: 1 wk. / drying on hot plate |
| | | production process:<br>(followed from «light grey») |
| beige (light orange tone) | 5088 | 2 g of steatite + 20 ml nitric acid + 5 ml hydrochloric acid / soaking: 3 d. / drying on hot plate |
| beige (orange tone slightly more accentuated) | 5089 | 2 g of steatite + 15 ml nitric acid + 10 ml hydrochloric acid / soaking: 3 d. / drying on hot plate |
| which | 5090 | 2 g of steatite + 10 ml nitric acid + 15 ml hydrochloric acid / soaking: 3 d. / drying on hot plate |
| lightens slightly at each<br>↓ | 5091 | 2 g of steatite + 5 ml nitric acid + 20 ml hydrochloric acid / soaking: 3 d. / drying on hot plate |
| step | 5092 | 2 g of steatite + 25 ml hydrochloric acid / soaking: 3 d. / drying on hot plate |
| | | production process:<br>(followed from «chamois») |
| beige (light orange tone) | 5093 | 0↑1700 °F |
| beige (orange tone more accentuated) | 5093.1 | 0↑1800 °F |
| ↓ | | |
| beige (orange tone) | 5093.2 | 0↑1900 °F |

| | | |
|---|---|---|
| still more accentuated) | | (followed at «light orange-brown») |
| orange-beige | 5094 | mineral : steatite<br>rock : light evergreen<br>powder : white<br>origin : East Broughton, Québec<br><br>production process:<br>0↑1200 °F (light grey [light brown tone]): 2 g + 25 ml nitric acid / soaking: 3 d. / drying on hot plate<br>(followed at «light orange-brown») |
| orange-beige | 5095 | production process:<br>1600 °F / 1 h<br>(followed at «light orange-brown») |
| orange-beige | 5096 | mineral : stibnite<br>rock : dark grey, with silver and blue metallic brilliance<br>powder : dark grey<br>origin : Consolidated Durham Mine, Saint-Georges, New Brunswick<br><br>production process:<br>1 g of stibnite + 100 ml sulphuric acid / soaking: 2 wk. / drying on hot plate (white [light beige reflection]) / irradiated with gamma rays at 64.7 Mrad<br>(followed at «dark chocolate-brown [grey tone]») |
| orange-beige | 5097 | mineral : fuel oil soot[84]<br>powder : profound brownish black<br>origin : boiler room of Laval University, city of Québec, Québec<br><br>production process:<br>(followed from «mixture of particles: green / orange»)<br>2 g of soot + 2 g of sodium carbonate / 0↑1500 °F + 1 h at 1500 °F<br>(followed at «mixture of particles: green / orange») |
| orange-beige | 5098 | mineral : sphalerite[31]<br>rock : honey-yellow<br>powder : pale honey-yellow<br>origin : Federal Mine, Lemieux district, Gaspésie, Québec<br><br>production process:<br>4 g of sphalerite + 20 ml hydrofluoric acid / soaking: 24 h / drying in oven at 100 °F (medium greyish brown): .3 g + 50 cc of transparent poly- |

| | | |
|---|---|---|
| | | ester resin + 1% of catalyst / manual grinding / moulding / hardening (very light greyish beige [yellow reflection]) / irradiated with gamma rays at 11.4 Mrad |
| orange-beige | 5099 | mineral : tremolite<br>rock : medium brown (evergreen tone)<br>powder : greyish beige<br>origin : Tetreault Mine, Montauban, Portneuf county, Québec<br><br>production process:<br>0↑1900 °F |
| orange-beige | 5100 | production process:<br>0↑1900 °F (orange-beige): .30 g + 50 ml hydrochloric acid / soaking: 2 wk. / drying on hot plate [657] |
| beige (light orange tone)<br>↓<br>beige (accentuated orange tone) | 5101<br><br><br>5102 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «light orange»)<br>0↑1000 °F (grey [accentuated beige tone]): 5 g + 20 ml nitric acid + 5 ml hydrochloric acid / soaking: 3 d. / drying on hot plate<br><br>0↑1000 °F (grey [accentuated beige tone]): 5 g + 15 ml nitric acid + 10 ml hydrochloric acid / soaking: 3 d. / drying on hot plate<br>(followed at «yellow ochre») |
| orange-beige much more accentuated than «orange-beige» | 5103 | mineral : vesuvianite<br>rock : lilac<br>powder : lilac<br>origin : John Mansville Mine, Asbestos, Québec<br><br>production process:<br>0↑1700 °F (beige darker than «beige») / powder irradiated with gamma rays at:<br>64.7 Mrad |

| | | |
|---|---|---|
| ↓<br>orange-beige still much more accentuated and more orange | 5104 | 424.7 Mrad |
| | | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 10 ml hydrochloric acid + 15 ml nitric acid / soaking: 3 d. / drying on hot plate (intense rusty orange): .5 g + 1 cc of white transparent printing ink / manual grinding / 14 superimpositions on white glazed paper [after a first copy of 14 superimpositions] (orange-beige) / irradiated with gamma rays at 11.4 Mrad[89,649] |
| orange-beige very lightly darker than «orange-beige» | 5105 | |
| | | mineral : dolomite<br>rock : white (localized yellow reflection), crystalline and translucid<br>powder : white<br>origin : Bristol district, Pontiac county, Québec<br><br>production process:<br>2 g of dolomite + 2 g of sodium carbonate / 0↑1500 °F + 1 h at 1500 °F (orange) / irradiated with electrons at: |
| orange-beige a bit darker than «orange-beige»<br>↓ | 5106 | 162,431 rad |
| orange-beige lightly darker | 5107 | 302,831 rad[45] |
| | | mineral : apatite<br>rock : medium brownish red<br>powder : light pinkish beige<br>origin : Ile Calumet, Pontiac county, Québec<br><br>production process:<br>1 g of apatite + 1 cc of white transparent synthetic enamel paint used for the car / manual grinding / applied on a piece of steel sheet used for the car's body measuring 1" x 1" (medium caramel-brown) / irradiated with gamma rays at: |

| | | |
|---|---|---|
| orange-beige fairly pronounced<br>↓<br>more intense orange-beige | 5108<br><br>5109 | 247.6 Mrad<br><br>360 Mrad |
| orange-beige much more pale than «medium orange-beige» | 5110 | mineral : actinolite<br>rock : light and cold evergreen<br>powder : light grey (light green tone)<br>origin : erratic block found at Saint-Philémon, near Dorchester, Québec<br><br>mineral : sulphur<br>rock : brilliant yellow<br>powder : brilliant yellow<br>origin : unknown<br><br><u>production process:</u><br>2 g of actinolite + 2 g of sulphur / 1300 °F / 1 h (medium orange-beige) / irradiated with gamma rays at 64.7 Mrad<br>(followed at «dark greyish beige [light orange reflection]») |
| orange-beige [between «light orange-beige» and «medium orange-beige»] | 5111 | mineral : andulusite<br>rock : light brownish grey<br>powder : light grey<br>origin : Bimbowrie, South Australia<br><br><u>production process:</u><br>2 g of andulusite + 2 g of sodium carbonate / 0↑1300 °F + 1 h at 1300 °F (light orange-beige) / irradiated with electrons at 302,831 rad[36] |
| orange-beige [between «light orange-beige» and «medium orange-beige»] | 5112 | mineral : olivine<br>rock : light grey, crystalline<br>powder : very light grey<br>origin : Mont Albert, Gaspésie, Québec<br><br><u>production process:</u><br>(followed from «orange-beige more accentuated than "medium orange-beige"»)<br>2 g of olivine + 2 g of sodium carbonate / 0↑1200 °F + 1 h at 1200 °F (medium orange-beige) / irradiated with electrons at 302,831 rad[45] |
| | | mineral : iron sulphide - nickel[353] |

| | | |
|---|---|---|
| orange-beige [between «light orange-beige» and «medium orange-beige»] | 5113 | rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>(followed from «orange darker than "orange"»)<br>2 g of iron sulphide - nickel + 2 g of sodium carbonate / 0↑1600 °F + 1 h at 1600 °F (orange [light green tone]) / irradiated with gamma rays at 424.7 Mrad |
| medium orange-beige | 5114 | mineral : actinolite<br>rock : cold and light evergreen<br>powder : light grey (light green tone)<br>origin : erratic block found at Saint-Philémon, near Dorchester, Québec<br><br>mineral : sulphur<br>rock : brilliant yellow<br>powder : brilliant yellow<br>origin : unknown<br><br><u>production process:</u><br>2 g of actinolite + 2 g of sulphur / 1300 °F / 1 h |
| medium beige (orange reflection) | 5115 | mineral : actinolite<br>rock : cold and light evergreen<br>powder : light grey (light green tone)<br>origin : erratic block found at Saint-Philémon, near Dorchester, Québec<br><br><u>production process:</u><br>2 g of actinolite + 2 g of sodium carbonate / 0↑1500 °F + 1 h at 1500 °F (beige [very light orange tone]) / irradiated with electrons at 302,831 rad[36] |
| | | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «medium beige [pinkish orange tone]») |

| | | |
|---|---|---|
| | | 50 g of asbestos + 200 ml hydrochloric acid or asbestos entirely covered with hydrochloric acid / soaking: 1 wk. / drying on hot plate (vivid yellow): 4 g + 1 g of sodium carbonate: |
| medium beige (light orange tone) | 5116 | 0↑1400 °F |
| ↓ | | |
| orange-beige more accentuated | 5117 | 0↑1500 °F |
| ↓ | | |
| orange-beige still more accentuated | 5118 | 0↑1600 °F |
| ↓ | | |
| orange-beige a bit lighter | 5119 | 0↑1700 °F (followed at «orange-beige [yellow tone]») |
| medium orange-beige | 5120 | production process: 2 g of asbestos + 2 g of sodium carbonate / 1900 °F / 1 h (green [with brown particles]) / irradiated with electrons at 302,831 rad[36] |
| medium orange-beige | 5121 | production process: 2 g of asbestos + 2 g of sodium carbonate / 1800 °F / 1 h (light khaki-green) / irradiated with gamma rays at 190.22 Mrad (followed at «dark beige [light orange-pink tone]») |
| | | production process: 2 g of asbestos + 2 g of sodium carbonate / 1800 °F / 1 h (light khaki-green) / irradiated with electrons at: |
| medium orange-beige | 5122 | 162,431 rad |
| ↓ | | |
| medium orange-beige | 5123 | 302,831 rad[45] |
| | | mineral : andulusite<br>rock : light brownish grey<br>powder : light grey<br>origin : Bimbowrie, South Australia |
| medium beige (light orange tone) | 5124 | production process: 0↑1900 °F (light beige): 1 g + 50 ml hydrochloric acid / soaking: 2 wk. / drying on hot plate |
| | | mineral : anorthosite<br>rock : light grey<br>powder : very, very light greyish beige<br>origin : rang Sainte-Germaine, Oka, Québec |

| | | |
|---|---|---|
| medium orange-beige | 5125 | <u>production process:</u><br>(followed from «greyish beige»)<br>powder irradiated with gamma rays at 424.7 Mrad |
| medium beige (lightened orange tone) | 5126 | mineral : antigorite<br>rock : pale yellowish green<br>powder : very light greenish yellow<br>origin : Canadian Refractories Mine, Kilmar, Québec<br><br><u>production process:</u><br>1000 °C / 1 h (light orange-chamois) / powder irradiated with electrons at 302,831 rad[36] |
| medium orange-beige | 5127 | <u>production process:</u><br>2 g of antigonite + 2 g of sodium carbonate / 0↑1900 °F + 1 h at 1900 °F (mixture of particles: olive / beige) / irradiated with electrons at 162,431 rad<br>(followed at «light brownish beige») |
| medium beige (light orange tone) | 5128 | mineral : apatite<br>rock : reddish brown<br>powder : light pinkish beige<br>origin : Calumet, Pontiac county, Québec<br><br><u>production process:</u><br>(followed from «greyish beige [yellow tone]»)<br>1000 °C / 1 h (light greyish beige) / powder irradiated with gamma rays at 482.984 Mrad |
| medium orange-beige | 5129 | mineral : armenite<br>rock : light grey<br>powder : very light grey<br>origin : Abitibi, Québec<br><br><u>production process:</u><br>(followed from «beige»)<br>0↑2000 °F (very light beige) / powder irradiated with gamma rays at 424.7 Mrad |
| medium orange-beige | 5130 | mineral : barite<br>rock : pinkish white<br><br>powder : white<br>origin : Niobec Mine, Saint-Honoré, Saguenay, Québec<br><br><u>production process:</u><br>(followed from «light orange-beige»)<br>powder irradiated with gamma rays at 604.53 Mrad[571,674] |

| | | |
|---|---|---|
| medium orange-beige | 5131 | mineral : bauxite[92]<br>powder : pinkish beige, mat<br>origin : Alcan Company, French Guyana<br><br>production process:<br>2 g of bauxite + 2 g of sodium carbonate / 0↑1400 °F + 1 h at 1400 °F (yellow ochre darker than «yellow ochre») / irradiated with gamma rays at 64.7 Mrad<br>(followed at «dark beige») |
| medium orange-beige<br>↓ | 5132 | production process:<br>2 g of bauxite + 2 g of sodium carbonate / 0↑1400 °F + 1 h at 1400 °F (yellow ochre darker than «yellow ochre») / irradiated with electrons at:<br>162,431 rad |
| medium orange-beige more accentuated, more luminous and slightly more orange | 5133 | 302,831 rad[45] |
| medium orange-beige | 5134 | mineral : beryl<br>rock : light blue, slightly translucid<br>powder : light grey<br>origin : Abitibi, Québec<br><br>production process:<br>2 g of beryl + 20 ml hydrofluoric acid / soaking: 24 h / drying in oven at 100 °F (mixture of particles: light beige / light blue): .3 g + 50 cc of transparent polyester resin + 1% of catalyst / manual grinding / moulding / hardening (cold and light greenish grey) / irradiated with gamma rays at 5.7 Mrad |
| medium orange-beige and mat | 5135 | mineral : bornite<br>rock : reddish brown (with localized green and bluish green oxidation)<br>powder : reddish brown<br>origin : Lac Musset, Fosse du Labrador, Québec<br><br>production process:<br>(followed from «mat greenish orange» and «mixture of particles: dark and vivid greenish turquoise / dark and vivid olive-green»)<br>1 g of bornite + 20 ml hydrochloric acid / soaking: 6 d. / separation of the liquid and the solid / natural drying / colour of the solid[458]<br>(followed at «dark orange-beige») |

| | | |
|---|---|---|
| medium orange-beige | 5136 | production process:<br>(followed from «phtalo[217a]-green more pale than "light phtalo-green"»)<br>2 g of bornite + 10 ml nitric acid + 15 ml hydrochloric acid / soaking: 6 d. / separation of the liquid and the solid / natural drying (colour of the solid: mixture of particles: light phtalo[217a]-green / intense phtalo-green) / irradiated with gamma rays at 425.65 Mrad |
| medium beige (light orange tone) | 5137 | mineral : fluorescent calcite<br>rock : white (localized grey or brown reflection), translucid<br>powder : white (yellow reflection)<br>origin : Bancroft, Ontario<br><br>production process:<br>(followed from «brownish beige»)<br>2 g of calcite + 2 g of sodium carbonate / 0↑1300 °F + 1 h at 1300 °F (brownish beige [light orange-pink tone]) / irradiated with electrons at 302,831 rad[45] |
| medium orange-beige | 5138 | production process:<br>4 g of calcite + 20 ml hydrochloric acid / soaking: 3 d. / drying on hot plate (brown): .3 g + 50 cc of transparent polyester resin + 1% of catalyst / manual grinding / moulding (light grey [light green reflection]) / irradiated with gamma rays at 5.7 Mrad |
| medium beige (light orange reflection) | 5139 | mineral : calcite<br>rock : light pink<br>powder : pinkish white<br>origin : Huddersfield district, Pontiac county, Québec<br><br>production process:<br>(followed from «pinkish brown [grey tone]»)<br>1000 °C / 1 h (medium pinkish brown [grey tone]) / irradiated with gamma rays at 482.984 Mrad |
| medium orange-beige | 5140 | mineral : chalcopyrite<br>powder : dark grey (light green tone)<br>origin : Centre de recherche des Mines Noranda in Montréal, Québec<br><br>production process:<br>4 g of chalcopyrite + 50 ml nitric acid / as soon as the mineral is deposited in the acid, it starts to bubble / immediately after the bubbling, separation of the liquid and the solid / the 2 rest |

941

| | | |
|---|---|---|
| | | separately during 1 wk. / natural drying (colour of the solid: light chocolate-brown) / irradiated with electrons at 162,431 rad (followed at «yellowish beige lighter than "medium yellowish beige"») |
| medium beige (light orange tone) | 5141 | mineral : cryolite<br>rock : white, crystalline and translucid<br>powder : white<br>origin : Ivigtut, Groenland<br><br>production process:<br>(followed from «light orange-beige»)<br>powder irradiated with gamma rays at 484.704 Mrad |
| medium beige (with orange areas) | 5142 | production process:<br>(followed from «grey [with pink areas]»)<br>0↑1600 °F (white [with yellowish areas]) / irradiated with gamma rays at 424.7 Mrad |
| medium orange-beige | 5143 | mineral : diopside<br>rock : light grey<br>powder : light beige<br>origin : Mont Orford, Québec<br><br>mineral : sulphur<br>rock : brilliant yellow<br>powder : brilliant yellow<br>origin : unknown<br><br>production process:<br>2 g of diopside + 2 g of sulphur / 1300 °F / 1 h |
| medium beige (orange tone a bit more accentuated) | 5144 | production process:<br>2 g of diopside + 2 g of sulphur / 1300 °F / 1 h (medium orange-beige) / irradiated with gamma rays at 64.7 Mrad<br>(followed at «dark brownish beige [light orange tone]») |
| medium beige much more orange than «medium orange-beige»<br>↓ | 5145 | production process:<br>2 g of diopside + 2 g of sulphur / 1300 °F / 1 h (medium orange-beige) / irradiated with electrons at:<br>162,431 rad |
| orange-beige a bit more pale | 5146 | 302,831 rad[45] |

| | | |
|---|---|---|
| | | mineral : dolomite<br>rock : white (localized yellow reflection), crystalline and translucid<br>powder : white<br>origin : Bristol district, Pontiac county, Québec<br><br>mineral : sulphur<br>rock : brilliant yellow<br>powder : brilliant yellow<br>origin : unknown<br><br>production process: |
| medium orange-beige | 5147 | 2 g of dolomite + 2 g of sulphur / 1300 °F / 1 h (yellowish white [light grey reflection]) / irradiated with gamma[45,571] rays at 424.7 Mrad[81] |
| | | mineral : dolomite<br>rock : light grey<br>powder : light grey<br>origin : Shefferville, Ungava, Québec<br><br>mineral : sulphur<br>rock : brilliant yellow<br>powder : brilliant yellow<br>origin : unknown<br><br>production process: |
| medium orange-beige | 5148 | 2 g of dolomite + 2 g of sulphur / 1300 °F / 1 h |
| | | mineral : solid epidote<br>rock : brownish green<br>powder : brownish green<br>origin : James Bay, Québec<br><br>production process: |
| medium beige (light orange tone)<br>↓ | 5149 | 0↑1200 °F |
| darker beige (more accentuated orange tone) | 5150 | 0↑1300 °F<br>(followed at «dark reddish brown») |
| | | mineral : fluorine<br>rock : light pink, translucid<br>powder : white (light pink reflection)<br>origin : Saint-Lawrence Fluorspar Company, Saint-Lawrence, Newfoundland<br><br>production process:<br>(followed from «very pronounced violet») |
| medium beige (light | 5151 | 1000 °C / 1 h (white [yellow reflection]) / powder |

| | | |
|---|---|---|
| orange tone) | | irradiated with gamma rays at 482.984 Mrad |
| medium orange-beige | 5152 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>(followed from «light pinkish beige»)<br>powder irradiated with gamma rays at 604.53 Mrad |
| medium orange-beige | 5153 | mineral : goethite[106]<br>powder : rusty orange<br>origin : Red Mill, in the suburbs of Cap-de-la-Madeleine, Québec<br><br><u>production process:</u><br>(followed from «pinkish beige»)<br>0↑1400 °F / slow cooling in furnace (indian red[107]): 40 g + 200 ml phosphoric acid / soaking: 3 wk. / drying on hot plate [still humid] (light candy pink) / rinsed with soapy water (very, very light candy pink) / irradiated with gamma rays at 482.984 Mrad |
| medium orange-beige and mat | 5154 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br><u>production process:</u><br>(followed from «dark greyish brown [violet-pink tone]»)<br>2 g of goethite + 1 g of sodium carbonate + 1 g of sulphur + 1 g of zirconium silicate / 1600 °F / 1 h<br>(followed at «dark greyish brown» and «greyish brown [violet-pink tone], mat») |
| | | mineral : hornblende<br>rock : medium evergreen (light grey tone), with a vitreous brilliance<br>powder : medium cold grey (light green tone)<br>origin : Abitibi, Québec |

| | | |
|---|---|---|
| medium beige more brown (very light orange tone) | 5155 | production process:<br>0↑2000 °F (dark orange-beige) / powder irradiated with electrons at 302,831 rad[36] |
| medium beige (light orange tone) | 5156 | mineral : kaolin<br>rock : chalk-white (yellow reflection)<br>powder : chalk-white (yellow reflection)<br>origin : Saint-Rémi d'Amherst, Québec<br><br>production process:<br>(followed from «orange»)<br>2 g of kaolin + 2 g of sodium carbonate / 0↑1500 °F + 1 h at 1500 °F (very light orange) / irradiated with gamma rays at 424.7 Mrad |
| medium orange-beige | 5157 | production process:<br>(followed from «white [yellow or pinkish reflection]»)<br>3 g of kaolin + 50 ml sulphuric acid / soaking: 2 wk. / drying on hot plate (white) / irradiated with gamma rays at 424.7 Mrad |
| medium beige (light orange tone) | 5158 | production process:<br>(followed from «light beige»)<br>0↑1900 °F (white [light pink reflection]): .20 g + 50 ml hydrochloric acid / soaking: 2 wk. / drying on hot plate (white) / irradiated with gamma rays at 424.7 Mrad |
| medium orange-beige | 5159 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>5 g of molybdenite + 50 ml hydrochloric acid / soaking: 2 wk. / drying on hot plate (light cream) / irradiated with gamma rays at 64.7 Mrad (followed at «very dark brownish beige [grey tone]») |
| medium orange-beige | 5160 | mineral : olivine<br>powder : colourless (green reflection)<br>origin : Mount Haven, United States<br><br>production process:<br>(followed from «cream»)<br>30 g of olivine + 100 ml sulphuric acid / soaking: 24 h / drying on hot plate (light cream [light orange tone]) / irradiated with gamma rays at |

| | | |
|---|---|---|
| | | 423.88 Mrad |
| medium orange-beige | 5161 | mineral : olivine<br>rock : light grey, crystalline<br>powder : very light grey<br>origin : Mont Albert, Gaspésie, Québec<br><br>mineral : sulphur<br>rock : brilliant yellow<br>powder : brilliant yellow<br>origin : unknown<br><br>production process:<br>2 g of olivine + 2 g of sulphur / 1300 °F / 1 h |
| medium orange-beige a bit more orange than «medium orange-beige» | 5162 | production process:<br>2 g of olivine + 2 g of sulphur / 1300 °F / 1 h (medium orange-beige) / irradiated with gamma rays at 64.7 Mrad<br>(followed at «medium orange-brown») |
| medium orange-beige | 5163 | mineral : olivine<br>rock : light grey, crystalline<br>powder : very light grey<br>origin : Mont Albert, Gaspésie, Québec<br><br>production process:<br>(followed from «brownish beige»)<br>2 g of olivine + 2 g of sodium carbonate / 0↑1200 °F + 1 h at 1200 °F<br>(followed at «russet brown») |
| medium orange-beige | 5164 | mineral : orthoclase<br>rock : white (grey reflection)<br>powder : white (grey reflection)<br>origin : mine near Buckingham, Papineau county, Québec<br><br>production process:<br>(followed from «very light beige»)<br>2 g of orthoclase + 20 ml nitric acid / soaking: 3 d. / drying on hot plate (white [light yellow reflection]) / irradiated with gamma rays at 423.88 Mrad |
| medium beige (orange reflection) | 5165 | production process:<br>(followed from «fairly dark brownish beige»)<br>rock hermetically wrapped in bread dough / 1600 °F / 1 h (white [beige and grey reflections]) / the rock is removed from the dough and irradiated with gamma rays at 424.7 Mrad[659] |
| | | mineral : orthoclase<br>rock : white (grey reflection) |

| | | |
|---|---|---|
| | | powder : white (grey reflection)<br>origin : mine near Buckingham, Papineau county, Québec<br><br>mineral : sulphur<br>rock : brilliant yellow<br>powder : brilliant yellow<br>origin : unknown |
| medium orange-beige | 5166 | production process:<br>(followed from «pinkish beige a bit more accentuated than "light pinkish beige"»)<br>2 g of orthoclase + 2 g of sulphur / 1300 °F / 1 h (light beige [light pink tone]) / irradiated with gamma rays at 424.7 Mrad |
| medium orange-beige | 5167 | production process:<br>(followed from «pinkish beige a bit more accentuated than "light pinkish beige"»)<br>2 g of orthoclase + 2 g of sulphur / 1500 °F / 1 h (light beige with light pink tone) / irradiated with gamma rays at 424.7 Mrad |
| medium beige (light orange tone) | 5168 | mineral : sericite shale<br>rock : light grey (green reflection)<br>powder : very, very light grey<br>origin : Magog, Québec<br><br>production process:<br>1000 °C / 1 h |
| medium beige (light orange tone) | 5169 | production process:<br>0↑1000 °C |
| medium orange-beige [strong orange tone] | 5170 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>0↑900 °F (fairly dark yellowish beige): 1 g + 40 ml nitric acid / natural drying |
| | | mineral : serpentine<br>rock : yellowish green<br>powder : light greenish yellow<br>origin : probably Thetford Mines, Eastern Townships, Québec |

| | | |
|---|---|---|
| medium orange-beige | 5171 | production process:<br>(followed from «light chamois [light orange-pink tone]»)<br>0↑2200 °F |
| medium beige (very light orange tone) | 5172 | production process:<br>(followed from «light orange-chamois»)<br>2 g of serpentine + 2 g of sodium carbonate / 0↑1400 °F + 1 h at 1400 °F (pale orange) / irradiated with gamma rays at 424.7 Mrad[239,660] |
| medium beige (light orange tone) | 5173 | mineral : steatite<br>rock : cold light grey, slightly translucid<br>powder : light grey<br>origin : East Broughton, Québec<br><br>production process:<br>(followed from «light orange»)<br>0↑1200 °F (grey more accentuated than «light grey»): 2 g + 25 ml hydrochloric acid / soaking: 3 d. / drying on hot plate<br>(followed at «light creamy beige») |
| medium orange-beige | 5174 | mineral : steatite<br>rock : light evergreen<br>powder : white<br>origin : East Broughton, Québec<br><br>production process:<br>0↑1700 °F (dark brownish orange) / powder irradiated with electrons at 302,831 rad[36] |
| medium beige (light orange tone) | 5175 | mineral : tremolite<br>rock : medium brown (evergreen tone)<br>powder : greyish beige<br>origin : Tetreault Mine, Montauban, Portneuf county, Québec<br><br>production process:<br>6 g of tremolite + 50 ml nitric acid / soaking: 2 wk. / drying on hot plate |
| medium beige (light orange tone) | 5176 | mineral : obsidian<br>rock : very dark smoky grey, almost black<br>powder : light grey<br>origin : Arkansas, United States<br><br>production process:<br>(followed from «beige [orange-pink tone]»)<br>1000 °C / 1 h (light pinkish beige) / irradiated with gamma rays at 424.7 Mrad |
| | | mineral : wilsonite, local variety of scapolite |

| | | |
|---|---|---|
| | | or wernerite<br>rock : grey (violet tone)<br>powder : light grey (lilac tone)<br>origin : Tetreault mine, Montauban, Portneuf county, Québec |
| medium orange-beige | 5177 | production process:<br>(followed from «light beige [light pink tone]»)<br>2 g of wilsonite + 2 g of sodium carbonate / 0↑1500 °F + 30 min. at 1500 °F (light accentuated green) / irradiated with gamma rays at 424.7 Mrad |
| orange-beige a bit more accentuated than «medium orange-beige» | 5178 | mineral : olivine<br>rock : light grey, crystalline<br>powder : very light grey<br>origin : Mont Albert, Gaspésie, Québec<br><br>production process:<br>2 g of olivine + 2 g of sodium carbonate / 0↑1200 °F + 1 h at 1200 °F (medium orange-beige) / irradiated with electrons at 162,431 rad (followed at «orange-beige [between "light orange-beige" and "medium orange-beige"]») |
| | | mineral : andulusite<br>rock : light brownish grey<br>powder : light grey<br>origin : Bimbowrie, South Australia<br><br>production process:<br>0↑1900 °F (light beige): 1 g + 50 ml hydrochloric acid / soaking: 2 wk. / drying on hot plate (medium beige [light orange tone]) / irradiated with gamma rays at: |
| beige (accentuated orange tone) a bit darker and much more intense than «medium orange-beige»<br>↓ | 5179 | 70.4 Mrad |
| dark beige (orange reflection) | 5180 | 430.4 Mrad |
| beige (light orange tone) a bit darker than «medium orange-beige» | 5181 | production process:<br>4 g of andulusite + 80 ml nitric acid / soaking: 2 wk. / drying on hot plate (medium khaki-beige) / irradiated with gamma rays at 70.4 Mrad (followed at «dark beige») |

| | | |
|---|---|---|
| orange-beige a bit darker than «medium orange-beige» | 5182 | mineral : olivine<br>rock : light grey, crystalline<br>powder : very light grey<br>origin : Mont Albert, Gaspésie, Québec<br><br>production process:<br>2 g of olivine + 2 g of sodium carbonate /<br>0↑1200 °F + 1 h at 1200 °F (medium orange-beige) /<br>irradiated with gamma rays at 63.88 Mrad<br>(followed at «brownish beige [orange reflection]») |
| beige (lightened orange tone) a bit darker than «medium orange-beige» | 5183 | mineral : sericite shale<br>rock : light grey (green reflection)<br>powder : very, very light grey<br>origin : Magog, Québec<br><br>production process:<br>1000 °C / 1 h (medium beige [light orange tone]) /<br>irradiated with electrons at 302,831 rad[36] |
| beige (light orange tone) much darker than «medium orange-beige»<br>↓ | 5184 | production process:<br>1000 °C / 1 h (medium beige [light orange tone]) /<br>irradiated with gamma rays at:<br>5.7 Mrad |
| dark orange-beige | 5185 | 365.7 Mrad |
| beige (light orange reflection) lighter than «dark orange-beige»<br>¦ | 5186 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «dark greyish beige»)<br>2 g of iron sulphide - nickel + 2 g of sodium carbonate:<br>0↑1100 °F + 1 h at 1100 °F |

| | | |
|---|---|---|
| beige slightly more orange<br>↓<br>beige still slightly more orange | 5187<br><br>5188 | 0↑1200 °F + 1 h at 1200 °F<br><br>0↑1300 °F + 1 h at 1300 °F<br>(followed at «pale mossy green») |
| | | mineral : granite gneiss<br>rock : reddish beige<br>powder : medium pink (light brown tone)<br>origin : Lac Beauport, region of the city of Québec, Québec<br><br><u>production process:</u> |
| dark orange-beige | 5189 | 0↑1900 °F (medium beige): 1 g + 50 ml hydrochloric acid / soaking: 2 wk. / drying on hot plate (rusty orange) / irradiated with electrons at 302,831 rad[36] |
| | | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «dark beige [pinkish orange tone]») 50 g of asbestos + 200 ml hydrochloric acid <u>or</u> asbestos entirely covered with hydrochloric acid / soaking: 1 wk. / drying on hot plate (vivid yellow): 4 g + 2 g of sodium carbonate: |
| dark orange-beige a bit more accentuated | 5190 | 0↑1300 °F |
| dark orange-beige [the orange tone | 5191 | 0↑1400 °F |
| becomes | 5192 | 0↑1500 °F |
| ↓<br>more accentuated] | 5193 | 0↑1600 °F<br>(followed at «dark beige [rusty orange tone]») |
| | | mineral : antigorite<br>rock : pale yellowish green<br>powder : very light greenish yellow<br>origin : Canadian Refractories Mine, Kilmar, Québec<br><br><u>production process:</u><br>(followed from «light orange-beige») |

| | | |
|---|---|---|
| dark orange-beige | 5194 | 2 g of antigonite + 2 g of sodium carbonate / 0↑1500 °F + 1 h at 1500 °F (intense olive-green) / irradiated with electrons at 302,831 rad*5 |
| dark beige (strong orange tone) | 5195 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>(followed from «beige darker and more intense than "very light beige"») 1000 °C / 1 h (very light beige) / powder irradiated with gamma rays at 482.984 Mrad |
| dark orange-beige | 5196 | mineral : bornite<br>rock : reddish brown (with localized green and bluish green oxidation)<br>powder : reddish brown<br>origin : Lac Musset, Fosse du Labrador, Québec<br><br>production process:<br>(followed from «dark greenish turquoise / dark olive-green» and «medium and mat orange-beige») 1 g of bornite + 30 ml hydrochloric acid / soaking: 6 d. / separation of the liquid and the solid / natural drying / colour of the solid (followed at «very, very acute lime-green [yellow tone]») |
| dark beige (accentuated orange tone) | 5197 | mineral : cryolite<br>rock : white, crystalline and translucid<br>powder : white<br>origin : Ivigtut, Groenland<br><br>production process:<br>(followed from «medium pinkish beige») 0↑1600 °F (white [with yellowish areas]): .20 g + 50 ml sulphuric acid / soaking: 2 wk. / drying on hot plate (white [very light pink reflection]) / irradiated with gamma rays at 424.7 Mrad |
| | | mineral : biotite gneiss<br>rock : blackish grey, golden vitreous brilliance<br>powder : dark grey<br>origin : Grenville geological province, Québec |

| | | |
|---|---|---|
| dark orange-beige, with metallic brilliance | 5198 | production process:<br>0↑1700 °F (dark reddish brown [golden reflection]) / irradiated with electrons at 305,200 rad[46] |
| dark orange-beige | 5199 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>1 g of goethite + 1 g of sodium carbonate + 1 g of titanium dioxide / 1600 °F / 1 h<br>(followed at «dark greyish milky chocolate-brown [pink tone]») |
| dark orange-beige | 5200 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>1 g of goethite + 1 g of titanium dioxide + 1 g of sodium carbonate + 1 g of zirconium silicate / 1600 °F / 1 h<br>(followed at «rusty brown») |
| | | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>mineral : sulphur<br>rock : brilliant yellow |

953

| | | |
|---|---|---|
| | | powder : brilliant yellow<br>origin : unknown |
| dark orange-beige | 5201 | production process:<br>1 g of goethite + 1 g of sodium carbonate + 1 g of sulphur + 1 g of zirconium silicate + 1 g of titanium dioxide / 1500 °F / 1 h<br>(followed at «dark brownish orange») |
| | | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>mineral : sulphur<br>rock : brilliant yellow<br>powder : brilliant yellow<br>origin : unknown<br><br>mineral : feldspar<br>rock : white, opaque<br>powder : white<br>origin : Baraute, Abitibi, Québec |
| dark orange-beige | 5202 | production process:<br>0↑1400 °F / slow cooling in furnace (indian red[107]): 1.50 g + 1.50 g of feldspar (dark reddish brown): .50 g + .50 g of sulphur + .50 g of sodium carbonate + .50 g of titanium dioxide + .50 g of zirconium silicate / 1600 °F / 1 h<br>(followed at «dark chocolate-brown») |
| | | mineral : hornblende<br>rock : medium evergreen (light grey tone), with a vitreous brilliance<br>powder : medium cold grey (light green tone)<br>origin : Abitibi, Québec |
| dark orange-beige | 5203 | production process:<br>0↑2000 °F |
| | | mineral : olivine<br>rock : light grey, crystalline<br>powder : very light grey<br>origin : Mont Albert, Gaspésie, Québec |

| | | |
|---|---|---|
| dark orange-beige | 5204 | <u>production process:</u><br>(followed from «light cream [beige tone]»)<br>4 g of olivine + 50 ml sulphuric acid / soaking: 2 wk. / drying on hot plate (white [very light beige reflection]) / irradiated with gamma rays at 424.7 Mrad |
| dark beige (accentuated orange tone) | 5205 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>(folowed from «lemon-yellow»)<br>4 g of pyrrhotite + 50 ml nitric acid / soaking: 2 wk. / separation of the liquid and the solid / natural drying (colour of the liquid: vivid lemon-yellow) / irradiated with gamma rays at 430.4 Mrad |
| fairly dark orange-beige | 5206 | mineral : steatite<br>rock : light evergreen<br>powder : white<br>origin : East Broughton, Québec<br><br><u>production process:</u><br>0↑1700 °F (dark brownish orange) / powder irradiated with gamma rays at:<br>64.7 Mrad |
| ↓ dark orange-beige | 5207 | 424.7 Mrad |
| dark orange-beige | 5208 | mineral : stibnite<br>rock : dark grey, silver and blue metallic brilliance<br>powder : dark grey<br>origin : Consolidated Durham Mine, Saint-Georges, New Brunswick<br><br><u>production process:</u><br>(followed from «beige»)<br>1 g of stibnite + 100 ml nitric acid / soaking: 2 wk. / separation of the liquid and the solid / drying on hot plate (colour of the solid: light creamy yellow) / irradiated with gamma rays at 424.7 Mrad |
| | | mineral : tremolite<br>rock : medium brown (evergreen tone)<br>powder : greyish beige<br>origin : Tetreault Mine, Montauban, Portneuf county, Québec |

| | | |
|---|---|---|
| dark orange-beige | 5209 | <u>production process:</u><br>0↑2000 °F |
| dark orange-beige | 5210 | <u>production process:</u><br>6 g of tremolite + 50 ml nitric acid / soaking: 2 wk. / drying on hot plate (medium beige [light orange tone]) / irradiated with gamma rays at 424.7 Mrad[81,228] |
| dark orange-beige | 5211 | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><br><u>production process:</u><br>1 g of vesuvianite + 1 g of sulphur / 1700 °F / 1 h |
| | | mineral : hornblende<br>rock : medium evergreen (light grey tone), with a vitreous brilliance<br>powder : medium cold grey (light green tone)<br>origin : Abitibi, Québec<br><br><u>production process:</u><br>0↑2000 °F (dark orange-beige) / irradiated with gamma rays at: |
| orange-beige a bit darker than «dark orange-beige»<br>↓ | 5212 | 65.704 Mrad |
| orange-beige still darker | 5213 | 124.704 Mrad<br>(followed at «medium orange-brown») |
| mixture of particles | | |
| | | mineral : agate<br>rock : grey (with a light orange circular area on the surface), slightly translucid<br>powder : light grey<br>origin : unknown |

| | | |
|---|---|---|
| light beige (light orange tone) / dark brown | 5214 | <u>production process:</u><br>3 g of agate + 40 ml hydrochloric acid / soaking: 1 wk. / separation of the liquid and the solid / natural drying (colour of the liquid: green) / irradiated with electrons at 305,200 rad[73] |
| light orange-beige / medium greyish beige | 5215 | mineral : microcline<br>rock : white (grey reflection)<br>powder : white (grey reflection)<br>origin : Buckingham, Québec<br><br><u>production process:</u><br>(followed from «lemon-yellow more accentuated than "very light lemon-yellow"»)<br>4 g of microcline + 80 ml hydrochloric acid / soaking: 2 wk. / drying on hot plate (very light yellow) / irradiated with gamma rays at 424.7 Mrad |
| medium orange-beige / light greyish beige / light grey / white | 5216 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>(followed from «orange-chamois»)<br>2 g of asbestos + 2 g of sodium carbonate / 0↑1900 °F + 1 h at 1900 °F (very light chamois [light orange tone]) / irradiated with gamma rays at 550.22 Mrad |
| medium orange-beige / white / light beige | 5217 | mineral : cryolite<br>rock : white, crystalline and translucid<br>powder : white<br>origin : Ivigtut, Groenland<br><br><u>production process:</u><br>4 g of cryolite + 50 ml nitric acid / soaking: 2 wk. / drying on hot plate (white [orange reflection]) / irradiated with gamma rays at 424.7 Mrad[81] |
| medium beige (very, | 5218 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>(followed from «very, very light orange»)<br>2 g of fluorine + 20 ml nitric acid / |

957

| | | |
|---|---|---|
| very light orange tone) / medium brown (very light orange tone) | | soaking: 3 d. / drying on hot plate (very, very light orange) / irradiated with gamma rays at 424.7 Mrad |
| medium orange-beige / medium beige / very, very light beige | 5219 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «light beige»)<br>0↑1900 °F (light beige-grey): .50 g + 50 ml sulphuric acid / soaking: 2 wk. / drying on hot plate (white) / irradiated with gamma[239] rays at 424.7 Mrad |
| dark orange-beige / dark beige / dark brown / medium grey | 5220 | mineral : chromite<br>rock : blackish grey<br>powder : medium brownish grey<br>origin : Black Lake, near Thetford Mines, Québec<br><br>production process:<br>(followed from «dark iron-grey [light green tone]»)<br>4 g of chromite + 80 ml sulphuric acid / soaking: 2 wk. / drying on hot plate (intense mint-green [malachite-green type]) / irradiated with gamma rays at 424.7 Mrad[1209] |
| dark orange-beige / dark greyish brown | 5221 | mineral : cryolite<br>rock : white, crystalline and translucid<br>powder : white<br>origin : Ivigtut, Groenland<br><br>production process:<br>(followed from «very light yellow»)<br>4 g of cryolite + 50 ml hydrochloric acid / soaking: 2 wk. / drying on hot plate (white [light yellow reflection]) / irradiated with gamma rays at 424.7 Mrad |
| greenish orange-beige | | |
| | | mineral : spodumene<br>rock : pale green<br>powder : light grey, almost white<br>origin : Québec Lithium Co., Baraute, Abitibi, Québec |

| | | |
|---|---|---|
| very pale beige (light orange tone with apple-green reflection) | 5222 | production process:<br>2 g of spodumene + 80 ml hydrochloric acid / soaking: 2 wk. / drying on hot plate (light lemon-yellow) / irradiated with electrons at 302,831 rad[36] |
| orange-beige (green reflection) darker than «pale orange-beige (green reflection)» | 5223 | mineral : bornite<br>rock : reddish brown (with localized green and bluish green oxidation)<br>powder : reddish brown<br>origin : Lac Musset, Fosse du Labrador, Québec<br><br>production process:<br>(followed from «orange-beige»)<br>12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath (colour of the solid: pale greyish green [orange tone]) / irradiated with electrons at 305,200 rad[73] |
| greenish orange-beige | 5224 | mineral : corundum<br>rock : medium grey<br>powder : light grey<br>origin : Transvaal, Africa<br><br>production process:<br>1 g of corundum + 50 ml hydrochloric acid / soaking: 2 wk. / drying on hot plate (medium greyish beige [light yellow tone]) / irradiated with gamma rays at 70.4 Mrad<br>(followed at «dark greyish beige [green reflection]») |
| yellowish orange-beige | | |
| very light yellowish orange-beige | 5225 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «light orange-beige»)<br>2 g of quartz - mica + 2 g of sodium carbonate / 0↑1600 °F + 1 h at 1600 °F (orange-beige) / irradiated with electrons at 302,831 rad[45] |

| | | |
|---|---|---|
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «medium orange-beige»)<br>50 g of asbestos + 200 ml hydrochloric acid or asbestos entirely covered with hydrochloric acid / soaking: 1 wk. / drying on hot plate (vivid yellow): 4 g + 1 g of sodium carbonate: |
| yellowish orange-beige a bit lighter than «medium yellowish orange-beige»<br>↓ | 5226 | 0↑1800 °F |
| yellowish orange-beige still a bit lighter and more yellowish | 5227 | 0↑1900 °F |
| | | mineral : pyrophillite<br>rock : light beige (grey and pink tones), opaque<br>powder : very light beige (grey and orange-pink tones)<br>origin : Carpentier district, Abitibi, Québec<br><br>production process: |
| beige (light yellow or orange tone) darker than «medium orange-beige or yellow-beige» | 5228 | 0↑1900 °F (light beige): .20 g + 50 ml sulphuric acid / soaking: 2 wk. / drying on hot plate (medium beige [very light grey tone]) / irradiated with gamma rays at 424.7 Mrad |
| pinkish orange-beige | | |
| | | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>(followed from «beige [pinkish orange tone lighter than "pronounced beige [pinkish orange tone]"») |

960

| | | |
|---|---|---|
| pale beige (light pinkish orange tone) | 5229 | 4 g of mica + 50 ml hydrochloric acid / soaking: 4 wk. / drying on hot plate (pronounced beige [pinkish orange tone]) / irradiated with electrons at 302,831 rad[45] |
| pinkish orange-beige lighter than «very light pinkish orange-beige» | 5230 | mineral : microcline<br>rock : white (grey reflection)<br>powder : white (grey reflection)<br>origin : Buckingham, Québec<br><br>mineral : sulphur<br>rock : brilliant yellow<br>powder : brilliant yellow<br>origin : unknown<br><br>production process:<br>2 g of microcline + 2 g of sulphur / 1300 °F / 1 h (very, very light beige [light grey tone, almost white]) / irradiated with gamma rays at 424.7 Mrad[81] |
| very light beige (light pinkish orange tone) | 5231 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br>production process:<br>1300 °F / 1 h |
| very light pinkish orange-beige<br>↓<br>light pinkish orange-beige | 5232<br><br>5233 | mineral : calcite (with clayey inclusions)<br>rock : very light creamy yellow, translucid<br>powder : white<br>origin : De-Mix quarry, near Saint-Philippe de Laprairie, Québec<br>production process:<br>(followed at «beige tone»)<br>0↑1100 °F<br><br>0↑1200 °F<br>(followed at «light orange-beige») |
| | | mineral : beryl<br>rock : intense grass-green, slightly translucid<br>powder : greenish grey<br>origin : unknown |

961

| | | |
|---|---|---|
| light pinkish orange-beige | 5234 | <u>production process:</u><br>(followed from «light beige»)<br>3 g of beryl + 40 ml sulphuric acid / soaking: 18 d. / separation of the liquid and the solid / drying on hot plate (colour of the liquid: very, very light grey, almost white [with a few «cobalt-blue» particles]) / irradiated with electrons at 305,200 rad[73] |
| light orange-beige (pink reflection) | 5235 | mineral : granite gneiss<br>rock : reddish beige<br>powder : medium pink (light brown tone)<br>origin : Lac Beauport, region of the city of Québec, Québec<br><br><u>production process:</u><br>(followed from «orange [pink and beige tones]»)<br>powder irradiated with gamma rays at 424.7 Mrad |
| light beige (light pinkish orange tone) | 5236 | mineral : kaolin<br>rock : chalk-white (yellow reflection)<br>powder : chalk-white (yellow reflection)<br>origin : Saint-Rémi d'Amherst, Québec<br><br><u>production process:</u><br>(followed from «light pinkish beige»)<br>0†1900 °F (white [light pink reflection]) / powder irradiated with gamma rays at 424.7 Mrad |
| light beige (very light pinkish orange tone) | 5237 | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>(followed from «beige darker than "very light beige"»)<br>4 g of mica + 50 ml sulphuric acid / soaking: 4 wk. / drying on hot plate (very light beige) / irradiated with gamma[239] rays at 424.7 Mrad |
| | | mineral : andulusite<br>rock : light brownish grey<br>powder : light grey<br>origin : Bimbowrie, South Australia |

962

| | | |
|---|---|---|
| pinkish orange-beige | 5238 | production process:<br>(followed from «pinkish beige»)<br>0↑2000 °F (light beige [light pink tone]) / powder irradiated with gamma rays at 424.7 Mrad |
| pinkish orange-beige | 5239 | production process:<br>2 g of andalusite + 2 g of sodium carbonate / 0↑1700 °F + 1 h at 1700 °F (mixture of particles: pale greenish turquoise / olive-green) / irradiated with electrons at 162,431 rad |
| pinkish orange-beige | 5240 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «medium greyish beige»)<br>.50 g of asbestos + .50 g of sodium carbonate / 0↑1600 °F<br>(followed at «mixture of particles: light green / beige») |
| pinkish orange-beige | 5241 | mineral : calcite (with clayey inclusions)<br>rock : very light creamy yellow, translucid<br>powder : white<br>origin : De-Mix quarry, near Saint-Philippe de Laprairie, Québec<br>production process:<br>0↑1200 °F (light beige [pinkish orange tone]) / powder irradiated with gamma rays at:<br>64.7 Mrad |
| ↓<br>beige more beige (pinkish orange tone) | 5242 | 424.7 Mrad |
| pinkish orange-beige | 5243 | mineral : vesuvianite<br>rock : lilac<br>powder : lilac<br>origin : John Mansville Mine, Asbestos, Québec<br><br>production process:<br>0↑500 °F (lilac [light beige tone]): .50 g + 40 ml hydrochloric acid / natural drying<br>(followed at «dark beige [pinkish orange tone]») |
| | | mineral : armenite<br>rock : light grey<br>powder : very light grey |

| | | |
|---|---|---|
| pinkish orange-beige [between «light pinkish orange-beige» and «medium pinkish orange-beige»] | 5244 | origin : Abitibi, Québec<br><br>production process:<br>(followed from «grey more accentuated than "very light grey"»)<br>powder irradiated with gamma rays at 424.7 Mrad |
| medium pinkish orange-beige | 5245 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «old rose [grey tone and orange reflection]»)<br>50 g of asbestos + 200 ml hydrochloric acid or asbestos entirely covered with hydrochloric acid / soaking: 1 wk. / drying on hot plate (vivid yellow): 4 g + 1 g of sodium carbonate / 0↑1300 °F (followed at «medium orange-beige») |
| medium beige (light pinkish orange tone) | 5246 | mineral : calcite<br>rock : light pink<br>powder : pinkish white<br>origin : Huddersfield district, Pontiac county, Québec<br>production process:<br>(followed from «light beige»)<br>powder irradiated with gamma rays at 604.53 Mrad |
| medium pinkish orange-beige | 5247 | mineral : calcite (with clayey inclusions)<br>rock : very light creamy yellow, translucid<br>powder : white<br>origin : De-Mix quarry, near Saint-Philippe de Laprairie, Québec<br>production process:<br>(followed from «light orange-beige»)<br>1600 °F / 1 h |
| ↓<br>very accentuated medium pinkish | 5248 | 0↑1600 °F + 15 h at 1600 °F |

| | | |
|---|---|---|
| orange-beige | | (followed at «pinkish beige») |
| medium pinkish orange-beige | 5249 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>mineral : cement[1138]<br>powder : white<br><br><u>production process:</u><br>(followed from «milky chocolate-brown [orange-pink tone]»)<br>5 g of shale + 27.40 g of cement + 13 cc of water / manual grinding / moulding / hardening / 0↑1600 °F<br>(followed at «light greyish beige») |
| medium beige (intense pinkish orange tone) | 5250 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>rock : white<br>powder : NL Chem Canada Inc., Québec<br><u>production process:</u><br>50 g of asbestos + 200 ml hydrochloric acid <u>or</u> asbestos entirely covered with hydrochloric acid / soaking: 1 wk. / drying on hot plate (vivid yellow): .50 g + .50 g of titanium dioxide / 1500 °F / 1 h<br>(followed at «orange-beige») |
| pinkish orange-beige a bit lighter than «pronounced pinkish orange-beige» | 5251 | mineral : mica<br>rock : golden brown, with vitreous luster, translucid<br>powder : light amber, with vitreous luster, translucid<br>origin : Lac Vert mountain, region of Low, near Hincks, Québec<br><u>production process:</u><br>4 g of mica + 50 ml hydrochloric acid / soaking: 4 wk. / drying on hot plate (pronounced beige [pink-orange tone]) / irradiated with electrons at 162,431 rad<br>(followed at «pale beige [pink-orange tone]») |

| | | |
|---|---|---|
| pronounced pinkish orange-beige | 5252 | production process:<br>4 g of mica + 50 ml hydrochloric acid / soaking: 4 wk. / drying on hot plate |
| dark pinkish orange-beige | 5253 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «old rose [orange-pink tone and violet reflection]»)<br>50 g of asbestos + 200 ml hydrochloric acid or asbestos entirely covered with hydrochloric acid / soaking: 1 wk. / drying on hot plate (vivid yellow): 4 g + 2 g of sodium carbonate / 0↑1200 °F (followed at «dark orange-beige») |
| dark pinkish orange-beige | 5254 | mineral : apatite<br>rock : medium brownish red<br>powder : light pinkish beige<br>origin : Ile Calumet, Pontiac county, Québec<br><br>mineral : sulphur<br>rock : brilliant yellow<br>powder : brilliant yellow<br>origin : unknown<br><br>production process:<br>(followed from «pinkish beige darker than "medium pinkish beige"»)<br>2 g of apatite + 2 g of sulphur / 1300 °F / 1 h (medium pinkish beige) / irradiated with gamma rays at 424.7 Mrad |
| dark beige (light pinkish orange tone) | 5255 | mineral : calcite<br>rock : light pink<br>powder : pinkish white<br>origin : Huddersfield district, Pontiac county, Québec<br>production process:<br>(followed from «very, very light beige»)<br>1500 °F / 1 h<br>(followed at «dark pinkish beige») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, |

| | | |
|---|---|---|
| | | Québec<br><br>mineral : sulphur<br>rock : brilliant yellow<br>powder : brilliant yellow<br>origin : unknown<br><br>production process:<br>2 g of molybdenite + 2 g of sulphur / 1300 °F / 1 h (Naples yellow [green tone]) / irradiated with electrons at 162,431 rad<br>(followed at «brownish beige [orange-pink tone] more pale than "medium brownish beige [orange-pink tone]"») |
| dark pinkish orange-beige | 5256 | |
| dark orange-beige (light pink tone) | 5257 | mineral : vesuvianite<br>rock : lilac<br>powder : lilac<br>origin : John Mansville Mine, Asbestos, Québec<br><br>production process:<br>(followed from «beige [pink-orange tone]»)<br>0↑700 °F (lilac [accentuated grey tone]): .50 g + 40 ml hydrochloric acid / natural drying<br>(followed at «dark beige [orange-pink tone]») |
| pinkish orange-beige (brown tone) | | |
| | | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>rock irradiated with gamma rays at: |
| pinkish orange-beige (brown tone) a bit darker than «pinkish orange-beige (brown tone)» | 5258 | 5 Mrad |
| pinkish orange-beige (brown tone) still a bit darker [more accentuated orange tone] | 5259 | 10 Mrad |
| darker pinkish orange-beige [brown and orange tones get more accentuated] | 5260 | 57.4 Mrad |
| | 5261 | 64.7 Mrad |
| | 5262 | 102.4 Mrad |
| | 5263 | 148.4 Mrad |
| | 5264 | 201.6 Mrad |

| | | |
|---|---|---|
| ↓ | 5265 | 247.6 Mrad |
| | 5266 | 287.3 Mrad |
| | 5267 | 360 Mrad[663]<br>(followed at «orange-brown») |
| reddish orange-beige | | |
| reddish orange-beige | 5268 | mineral : asbestos[4]<br>rock : dark grey (green reflection)<br>powder : light grey (green reflection)<br>origin : Asbestos Corporation Ltd., Thetford Mines, Québec<br><br>mineral : goethite[106]<br>powder : rusty orange<br>origin : Red Mill, in the suburbs of Cap-de-la-Madeleine, Québec<br><br><u>production process:</u><br>1 g of asbestos + 1 g of goethite[106] / 2000 °F / 45 min.[662,626] |
| reddish orange-beige | 5269 | mineral : peridotite<br>rock : medium grey<br>powder : medium brownish grey (green reflection)<br>origin : Thetford Mines, Québec<br><br><u>production process:</u><br>(followed from «orange-beige»)<br>2 g of peridotite + 2 g of sodium carbonate / 0†1500 °F + 1:30 h at 1500 °F<br>(followed at «greenish beige») |
| greyish orange-beige | | |
| light orange-beige (light grey tone) | 5270 | mineral : orthoclase<br>rock : white (grey reflection)<br>powder : white (grey reflection)<br>origin : mine near Buckingham, Papineau county, Québec<br><br><u>production process:</u><br>(followed from «light greyish beige»)<br>powder irradiated with gamma rays at 604.53 Mad |
| | | mineral : amethyst<br>rock : violet, translucid<br>powder : light grey (lilac tone)<br>origin : Thunderbay, Ontario<br><br><u>production process:</u><br>(followed from «violet-grey darker than "light |

| | | |
|---|---|---|
| medium greyish orange-beige | 5271 | violet-grey"») powder irradiated with gamma rays at 604.53 Mrad |
| dark orange-beige (light grey tone) | 5272 | mineral : granite gneiss<br>rock : reddish beige<br>powder : medium pink (light brown tone)<br>origin : Lac Beauport, region of the city of Québec, Québec<br><br>production process:<br>(followed from «brownish beige»)<br>0↑1900 °F (medium beige): 1 g + 50 ml sulphuric acid / soaking: 2 wk. / drying on hot plate (light greyish beige) / irradiated with gamma rays at 430.4 Mrad |
| orange-beige (pinkish grey tone) | | |
| orange-beige (light grey and pink tones) darker than «medium orange-beige (grey and pink tones)» | 5273 | mineral : anorthosite<br>rock : dark grey<br>powder : medium grey<br>origin : Jonquière, Lac Saint-Jean, Québec<br><br>production process:<br>2 g of anorthosite + 2 g of sodium carbonate / 0↑1400 °F + 1 h at 1400 °F (light chamois) / irradiated with gamma rays at 64.7 Mrad |
| rusty orange-beige | | |
| medium rusty orange-beige | 5274 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>10 g of silica + 100 ml hydrochloric acid / soaking: 1 wk. / drying on hot plate (light and vivid rusty orange): .2 g + 50 cc of transparent polyester resin + 1% of catalyst / manual grinding / moulding / hardening (medium amber-brown [orange tone]) / irradiated with gamma rays at 5.7 Mrad |

969

| | | |
|---|---|---|
| dark rusty orange-beige | 5275 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «dark orange-beige»)<br>50 g of asbestos + 200 ml hydrochloric acid or asbestos entirely covered with hydrochloric acid / soaking: 1 wk. / drying on hot plate (vivid yellow): 4 g + 2 g of sodium carbonate / 0↑1700 °F<br>(followed at «mixture of particles: dark beige [rusty orange tone] / beige [rusty orange tone and green reflection]») |
| mixture of particles | | |
| dark rusty orange-beige / rusty orange-beige (green reflection [dark olive-green type])<br>↓ | 5276 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «dark beige [rusty orange tone]»)<br>50 g of asbestos + 200 ml hydrochloric acid or asbestos entirely covered with hydrochloric acid / soaking: 1 wk. / drying on hot plate (vivid yellow): 4 g + 2 g of sodium carbonate:<br>0↑1800 °F |
| dark rusty orange-beige / apple-green | 5277 | 0↑1900 °F |
| beige (orange-copper tone) | | |
| | | mineral : steatite<br>rock : light cold grey, slightly translucid<br>powder : light grey<br>origin : East Broughton, Québec<br><br>production process:<br>(followed from «beige [golden yellow tone with |

| | | |
|---|---|---|
| | | grey reflection]») rock measuring 1/2" x 4 7/8" x 1/8", weighing 15 g and heated: |
| very accentuated beige (orange-copper tone and grey reflection) ↓ | 5278 | 0↑1600 °F + 1 h at 1600 °F |
| beige (orange-copper tone) more accentuated ↓ | 5279 | 0↑1600 °F + 2 h at 1600 °F |
| beige (orange-copper tone) still more accentuated ↓ | 5280 | 0↑1600 °F + 3 h at 1600 °F |
| beige (orange-coper tone) still more accentuated | 5281 | 0↑1700 °F (followed at «copper-beige [orange-pink tone]») |
| caramel-beige (orange tone) | | |
| caramel-beige (pronounced orange tone) | 5282 | mineral : mica<br>rock : golden brown, with vitreous luster, translucid<br>powder : light amber, with vitreous luster, translucid<br>origin : Lac Vert mountain, region of Low, near Hincks, Québec<br><u>production process:</u><br>4 g of mica + 50 ml nitric acid / soaking: 4 wk. / drying on hot plate |
| caramel-beige (orange tone lightened and replaced by a brown tone) | 5283 | <u>production process:</u><br>4 g of mica + 50 ml nitric acid / soaking: 4 wk. / drying on hot plate (caramel-beige [pronounced orange tone]) / irradiated with gamma rays at 64.7 Mrad (followed at «greyish beige») |
| caramel-beige (orange tone) much | 5284 | mineral : honey grossular garnet<br>rock : light pinkish beige<br>powder : very light beige<br>origin : Jeffrey Mine, Asbestos (presently J.-M. Asbestos), Québec<br><u>production process:</u><br>(followed from «beige / orange»)<br>rock irradiated with gamma[67,73] rays at 70.4 Mrad |

| | | |
|---|---|---|
| darker than «caramel-beige (orange tone)» | | (followed at «orange-beige») |
| medium caramel-beige (orange tone) | 5284a | mineral : sulphur<br>rock : brilliant yellow<br>powder : brilliant yellow<br>origin : unknown<br><br>production process:<br>1 g of sulphur + 5 g of pyrex / manual grinding / heated: 5 °C per min. 0↑1245 °C + maintenance during 1 h / cooling: 5 °C per min. until ambient temperature is reached / the entity is done in ambient air (milky white [with «dark greyish brown particles»] / irradiated with gamma rays at 4.94 Mrad (followed at «medium caramel-brown [very light pink tone]») |
| caramel-beige (pinkish orange tone) | | |
| medium caramel-beige (pinkish orange tone) | 5284.1 | mineral : selenium<br>powder : dark metallic grey<br>origin : Minéraux Noranda, lot 3847, Montréal, Québec<br><br>production process:<br>1 g of selenium + 5 g of pyrex / manual grinding / heated: 5 °C per min. 0↑1245 °C + maintenance during 1 h / cooling: 5 °C per min. until ambient temperature is reached / the entity is done in ambient air (very, very light yellowish beige) / irradiated with gamma rays at 4.94 Mrad |
| beige | | |
| beige reflection | 5285 | mineral : albite<br>powder : colourless (pink reflection)<br>origin : De-Mix quarry, North side of Mont Saint-Hilaire, Rouville county, Québec<br><br>production process:<br>(followed from «grey reflection»)<br>rock irradiated with gamma rays at 244.53 Mrad<br>(followed at «pinkish beige reflection») |
| beige reflection | 5286 | production process:<br>rock irradiated with electrons at 305,200 rad[44] |
| | | mineral : halite |

| | | |
|---|---|---|
| | | rock : colourless<br>powder : colourless<br>origin : Seleine Mine, Iles-de-la-Madeleine, Québec |
| beige reflection | 5287 | <u>production process:</u><br>rock hermetically wrapped in bread dough / 1500 °F / 1 h (white more opaque than «colourless») / irradiated with electrons at 164,800 rad (followed at «very light grey») |
| | | mineral : polylithionite<br>rock : transparent (beige reflection)<br>powder : transparent (beige reflection)<br>origin : De-Mix quarry, North side of Mont Saint-Hilaire, Rouville county, Québec |
| accentuated beige reflection | 5288 | <u>production process:</u><br>rock irradiated with gamma rays at 244.53 Mrad[666]<br>(followed at «light beige») |
| beige reflection | 5289 | <u>production process:</u><br>powder irradiated with gamma rays at 64.7 Mrad[89,665]<br>(followed at «very, very light yellow») |
| beige tint | 5290 | <u>production process:</u><br>.20 g of polylithionite + 50 ml sulphuric acid / soaking: 2 wk. / drying on hot plate |
| | | mineral : calcite (with clayey inclusions)<br>rock : very light creamy yellow, translucid<br>powder : white<br>origin : De-Mix quarry, near Saint-Philippe de Laprairie, Québec |
| beige tint | 5291 | <u>production process:</u><br>(followed from «white, semi-opaque»)<br>0↑1000 °F<br>(followed at «very light beige [pinkish orange tone]») |
| | | mineral : olivine<br>powder : colourless (green reflection)<br>origin : Mount Haven, United States |
| beige tint | 5292 | <u>production process:</u><br>(followed from «beige-grey tone»)<br>powder irradiated with gamma rays at 360 Mrad<br>(followed at «light orange») |

| | | |
|---|---|---|
| beige tint | 5293 | mineral : steatite<br>rock : cold light grey, slightly translucid: sticks measuring 1/2" x 4 7/8" x 1/8" and weighing 15 g<br>origin : East Broughton, Québec<br><br>production process:<br>2000 °F / 45 min. |
| very pale beige | 5294 | mineral : calcite (with clayey inclusions)<br>rock : very light creamy yellow, translucid<br>powder : white<br>origin : De-Mix quarry, near Saint-Philippe de Laprairie, Québec<br><br>production process:<br>0↑500 °F (white, semi-opaque) / irradiated with electrons at 305,200 rad[46] |
| very pale beige | 5295 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «light beige [light orange tone]») 2 g of sandstone + 2 g of sodium carbonate / 0↑1500 °F + 15 min. at 1500 °F (orange) / irradiated with electrons at 302,831 rad[45] |
| very pale beige | 5296 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><br>production process:<br>(followed from «grey darker than "light grey"») .50 g of iron sulphide - nickel + 4.50 g of cement + 3 cc of water / manual grinding / moulding / hardening (light grey):<br>0↑1200 °F |

| | | |
|---|---|---|
| ↓ | | |
| beige a bit more accentuated than «very pale beige» | 5297 | 0↑1400 °F |
| ↓ | | |
| beige still a bit more accentuated | 5298 | 0↑1600 °F |
| ↓ | | |
| beige still a bit more accentuated | 5299 | 0↑1800 °F |
| pale beige (with pale apple-green particles) | 5300 | mineral : Gaspé agate<br>rock : marbled nodule with shaded tints of white, pink and light grey, slightly translucid<br>powder : very light pinkish grey<br>origin : Mont Lyall, Gaspésie, Québec<br><br><u>production process:</u><br>4 g of agate + 40 ml hydrochloric acid / soaking: 1 wk. / separation of the liquid and the solid / natural drying / colour of the solid (followed at «apple-green [orange tone]») |
| various tones of pale beige | 5301 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>mineral : cement[1138]<br>powder : white<br><br><u>production process:</u><br>250 g of asbestos + 1650 ml hydrochloric acid in a 2000 ml becher <u>or</u> asbestos entirely covered with hydrochloric acid in a vertical container / soaking: 1 wk. / drying on hot plate (formation of 3 layers of superposed colours, the layer at the bottom being «apple-green»):<br>5 g + 27.40 g of cement + 19 cc of water / manual grinding / moulding / hardening / 0↑1900 °F |
| ↓ | 5302 | 1 g + 27.40 g of cement + 13 cc of water / manual grinding / moulding / hardening / 0↑1900 °F |

| | | |
|---|---|---|
| ↓ | 5303 | 1 g + 1 g of sulphur + 27.40 g of cement + 13 cc of water / manual grinding / moulding / hardening / 0†1900 °F |
| | 5304 | 1 g + 1 g of sulphur + 1 g of potassium carbonate + 27.40 g of cement + 13 cc of water / manual grinding / moulding / hardening / 0†1900 °F |
| | 5305 | 1 g + 1 g of potassium carbonate + 27.40 g of cement + 13 cc of water / manual grinding / moulding / hardening / 0†1900 °F |
| pale beige | 5306 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 20 ml hydrochloric acid + 5 ml nitric acid / soaking: 6 d. / separation of the liquid and the solid / natural drying (colour of the solid: very light yellowish green) / irradiated with gamma rays at 65.65 Mrad[667]<br>(followed at «mixture of particles: light milky chocolate-brown / dark milky chocolate-brown / medium milky chocolate-brown / dark grey / light grey») |
| pale beige | 5307 | mineral : honey grossular garnet<br>rock : light pinkish beige<br>powder : very light beige<br>origin : Jeffrey Mine, Asbestos (presently J.-M. Asbestos), Québec<br>production process:<br>1 g of garnet + 1 cc of white transparent synthetic enamel paint used for the car / manual grinding / application on a piece of steel sheet used for the car's body measuring 1" x 1" (very pale beige) / irradiated with gamma[351,352] rays at 57.4 Mrad<br>(followed at «fairly vivid rusty orange») |
| pale beige | 5308 | mineral : serandite<br>rock : beige (light pinkish orange tone), opaque<br>powder : light pink<br>origin : De-Mix quarry, North side of Mont Saint-Hilaire, Rouville county, Québec<br>production process:<br>(followed from «orange-yellow»)<br>12 g of serandite + 40 ml nitric acid / natural drying (very light creamy yellow) / irradiated |

| | | |
|---|---|---|
| | | with gamma rays at 424.7 Mrad |
| pale beige | 5309 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><br>production process:<br>(followed from «beige-grey»)<br>3 g of iron sulphide - nickel + 27.40 g of cement + 13 cc of water / manual grinding / moulding / hardening (very light grey) / 0↑1950 °F |
| beige darker than «pale beige» | 5310 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 months / natural drying (colour of the liquid: intense mint-green[299]): .3 g + 50 cc of transparent polyester resin + 1% of catalyst / manual grinding / moulding / hardening (pale and cold greenish grey) / irradiated with electrons at 155,082 rad<br>(followed at «grey [pronounced green tone]») |
| very, very light beige (almost white) | 5311 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml sulphuric acid / soaking: 33 d. / drying on hot plate |
| | | mineral : Gaspé agate<br>rock : marbled nodule with shaded tints of white, pink and light grey, slightly translucid<br>powder : very light pinkish grey<br>origin : Mont Lyall, Gaspésie, Québec |

| | | |
|---|---|---|
| very, very light beige | 5312 | production process:<br>4 g of agate + 40 ml nitric acid / soaking: 1 wk. / separation of the liquid and the solid / natural drying (colour of the solid: white) / irradiated with electrons at 164,800 rad<br>(followed at «very light beige») |
| | | mineral : asbestos[4]<br>rock : dark grey (green reflection)<br>powder : light grey (green reflection)<br>origin : Asbestos Corporation Ltd., Thetford Mines, Québec<br><br>mineral : cement[1138]<br>powder : white<br><br>production process:<br>250 g of asbestos + 1650 ml hydrochloric acid in a 2000 ml becher or asbestos entirely covered with hydrochloric acid in a vertical container / soaking: 1 wk. / drying on hot plate (formation of 3 superposed layers of colour, the layer at the bottom being «apple-green»): 3 g + 27.40 g of cement + 16 cc of water / manual grinding / moulding / hardening: |
| very, very light beige | 5313 | 0↑1300 °F |
| which | 5314 | 0↑1400 °F |
| | 5315 | 0↑1500 °F |
| | 5316 | 0↑1600 °F |
| ↓ | 5317 | 0↑1700 °F |
| accentuates itself a bit | 5318 | 0↑1800 °F<br>(followed at «very light greenish grey») |
| | | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>(followed from «beige lighter than "light beige"») |
| very, very light beige | 5319 | 1 g of analcime + 50 ml nitric acid / soaking: 2 wk. / drying on hot plate (light beige) / irradiated with electrons at 302,831 rad[45] |
| very, very light beige | 5320 | production process:<br>rock irradiated with electrons at 305,200 rad[46] |

978

| | | |
|---|---|---|
| very, very light beige | 5321 | mineral : andulusite<br>rock : light brownish grey<br>powder : light grey<br>origin : Bimbowrie, South Australia<br><br>production process:<br>2 g of andulusite + 2 g of sodium carbonate / 0↑1400 °F + 30 min. at 1400 °F (beige) / irradiated with electrons at 302,831 rad[36] |
| very, very light beige | 5322 | mineral : fluorescent calcite<br>rock : white (localized grey or brown reflection), translucid<br>powder : white (yellow reflection)<br>origin : Bancroft, Ontario<br><br>production process:<br>powder irradiated with electrons at 302,831 rad[36] |
| very, very light beige | 5323 | mineral : calcite (with clayey inclusions)<br>rock : very light creamy yellow, translucid<br>powder : white<br>origin : De-Mix quarry, near Saint-Philippe de Laprairie, Québec<br><br>production process:<br>4 g of calcite + 40 ml sulphuric acid / soaking: 14 d. / drying on hot plate (white) / irradiated with gamma rays at 65.65 Mrad<br>(followed at «medium beige») |
| very, very light beige | 5324 | mineral : calcite<br>rock : light pink<br>powder : pinkish white<br>origin : Huddersfield district, Pontiac county, Québec<br><br>production process:<br>0↑1000 °F<br>(followed at «dark beige [pinkish orange tone]») |
| | | mineral : dolomite<br>rock : white (localized yellow reflection), crystalline and translucid<br>powder : white<br>origin : Bristol district, Pontiac county, Québec<br><br>production process:<br>(followed from «light cream [yellow tone a bit |

| | | |
|---|---|---|
| | | more accentuated than "light yellowish cream") |
| | | 1000 °C / 1 h (light cream [yellow tone]) / powder irradiated with gamma rays at: |
| very, very light beige ↓ | 5325 | 122.984 Mrad |
| very, very light beige | 5326 | 482.984 Mrad |
| very, very light beige | 5327 | mineral : fluorine<br>rock : white (pink reflection), translucid<br>powder : white (grey reflection)<br>origin : Saint-Lawrence Fluorspar, Saint-Lawrence, Newfoundland<br><br>production process:<br>2 g of fluorine + 20 ml hydrochloric acid / soaking: 3 d. / drying on hot plate (white [very light yellow reflection]) / irradiated with gamma rays at 18.85 Mrad |
| very, very light beige | 5328 | mineral : almandite<br>rock : dark brownish red<br>powder : medium brownish red<br>origin : Gore Mountain, Warren county, state of New York, United States<br><br>production process:<br>4 g of almandite + 50 ml sulphuric acid / soaking: 2 wk. / separation of the liquid and the solid / drying on hot plate (colour of the liquid: very, very light green [almost white]) / irradiated with gamma rays at 70.4 Mrad<br>(followed at «light beige») |
| very, very light beige | 5329 | mineral : microcline<br>rock : white (grey reflection)<br>powder : white (grey reflection)<br>origin : Buckingham, Québec<br><br>production process:<br>1300 °F / 1 h (chalk-white) / powder irradiated with gamma rays at 64.7 Mrad<br>(followed at «light beige») |
| very, very light | 5330 | mineral : pyrophillite<br>rock : light beige (grey and pink tones), opaque<br>powder : very light beige (grey and orange-pink tones)<br><br>production process:<br>1 g of pyrophillite + 50 ml sulphuric acid / soa- |

| | | |
|---|---|---|
| beige | | king: 2 wk. / drying on hot plate (white [beige reflection]) / irradiated with electrons at 302,831 rad[36] |
| very, very light beige | 5331 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>2 g of silica + 2 g of sodium carbonate / 0↑1500 °F + 15 min. at 1500 °F (very light cream [almost white]) / irradiated with electrons at 162,431 rad<br>(followed at «very light greyish beige») |
| very, very light beige | 5332 | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid[106] / natural drying (colour of the 1st liquid: light cream [beige tone]) / irradiated with electrons at 302,831 rad[36] |
| very, very light beige | 5333 | mineral : steatite<br>rock : light cold grey, slightly translucid<br>powder : light grey<br>origin : East Broughton, Québec<br><br>production process:<br>2 g of steatite + 2 g of sodium carbonate / 0↑1500 °F + 1 h at 1500 °F (white [yellow reflection]) / irradiated with electrons at 302,831 rad[36] |
| | | mineral : stilbite<br>rock : white (honey reflection)<br>powder : white (honey reflection)<br>origin : Lac d'amiante Mine, Black Lake, Québec<br><br>production process:<br>1500 °F / 1 h (chalk-white [orange reflection]): |

| | | |
|---|---|---|
| | | .50 g + 40 ml hydrochloric acid / natural drying (white [very light yellow reflection]) / irradiated with electrons at: |
| very, very light beige ↓ | 5334 | 164,800 rad |
| very, very light beige | 5335 | 305,200 rad[73] |
| very, very light beige | 5336 | production process: 1500 °F / 1 h (chalk-white [orange reflection]) / rock irradiated with gamma rays at 64.7 Mrad (followed at «light beige») |
| beige more intense than «very, very light beige» | 5337 | mineral : beryl<br>rock : light blue, slightly translucid<br>powder : light grey<br>origin : Abitibi, Québec<br><br>production process:<br>2 g of beryl + 2 g of sodium carbonate / 0↑1800 °F + 1 h at 1800 °F (very light beige) / irradiated with gamma rays at 64.7 Mrad (followed at «greyish beige darker than "very, very light greyish beige"») |
| | | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 20 ml sulphuric acid / soaking: 24 h / drying on hot plate (grey [light brown tone]): .5 g + 1 cc of white opaque printing ink / manual grinding / 1 impression on white glazed paper [following a copy of 13 superimpositions] (very, very light beige) / irradiated with gamma rays at: |
| beige a bit darker than «very, very light beige» ↓ | 5338 | 11.4 Mrad[89] |
| beige still a bit darker ↓ | 5339 | 17.91 Mrad |
| beige still a bit darker | 5340 | 22.8 Mrad |
| | | mineral : armenite<br>rock : light grey |

| | | |
|---|---|---|
| beige more pale than «very light beige» | 5341 | powder : very light grey<br>origin : Abitibi, Québec<br><br><u>production process:</u><br>0↑2000 °F (very light beige) / irradiated with electrons at 302,831 rad[36] |
| beige more pale than «very light beige» | 5342 | mineral : polylithionite<br>rock : transparent (beige reflection)<br>powder : transparent (beige reflection)<br>origin : De-Mix quarry, North side of Mont Saint-Hilaire, Rouville county, Québec<br><br><u>production process:</u><br>.20 g of polylithionite + 50 ml sulphuric acid / soaking: 2 wk. / drying on hot plate (beige tone) irradiated with electrons at 302,831 rad[36] |
| beige a bit lighter than «very light beige» | 5343 | <u>production process:</u><br>.20 g of polylithionite + 50 ml sulphuric acid / soaking: 2 wk. / drying on hot plate (beige tone) / irradiated with gamma rays at 64.7 Mrad (followed at «light orange») |
| beige a bit lighter than «very light beige» | 5344 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>3 g of asbestos + 20 ml hydrofluoric acid / soaking: 24 h / drying in oven at 100 °F (light greyish beige): .5 g + 1 cc of white opaque printing ink / manual grinding / 1 impression on white glazed paper [after a copy of 16 superimpositions] (very light beige) / irradiated with gamma rays at 17.91 Mrad[90,668] |
| very light beige | 5345 | mineral : Gaspé agate<br>rock : marbled nodule with shaded tints of white, pink and light grey, slightly translucid<br>powder : very light pinkish grey<br>origin : Mont Lyall, Gaspésie, Québec<br><br><u>production process:</u><br>(followed from «very, very light beige»)<br>4 g of agate + 40 ml nitric acid / soaking: 1 wk./ |

| | | |
|---|---|---|
| | | separation of the liquid and the solid / natural drying (colour of the solid: white) / irradiated with electrons at 305,200 rad[73] |
| very light beige | 5345.1 | mineral : fluorine<br>rock : reddish violet, translucid<br>powder : very light grey<br>origin : Ohio, United States<br><br>production process:<br>1 g of fluorine + 5 g of pyrex / manual grinding / heating: 5 °C per min. 0↑1245 °C + maintenance during 1 h / cooling: 5 °C per min. until ambient temperature is reached / the entity is done in ambient air (crystalline white) / irradiated with gamma rays at 2.47 Mrad<br>(followed at «pinkish beige») |
| very light beige | 5346 | mineral : agate<br>rock : grey (with a light orange circular area on the surface), slightly translucid<br>powder : very light grey<br>origin : unknown<br><br>production process:<br>3 g of agate + 40 ml sulphuric acid / soaking: 14 d. / drying on hot plate (very light brownish grey [with a few green particles]) / irradiated with electrons at 164,800 rad<br>(followed at «light beige») |
| | | mineral : asbestos[4]<br>rock : dark grey (green reflection)<br>powder : light grey (green reflection)<br>origin : Asbestos Corporation Ltd., Thetford Mines, Québec<br><br>mineral : cement[1138]<br>powder : white<br><br>production process:<br>1 g of asbestos + 27.40 g of cement + 13 cc of water / manual grinding / moulding / hardening: |
| very light grey | 5347 | 0↑1000 °F |
| (light beige tone) | 5348 | 0↑1200 °F |
| | 5349 | 0↑1400 °F |
| tends | 5350 | 0↑1600 °F |
| towards | 5351 | 0↑1700 °F |
| | 5352 | 0↑1800 °F |
| ↓ | 5353 | 0↑1900 °F |
| very light beige | 5354 | 0↑1950 °F |

| | | |
|---|---|---|
| | | mineral : andulusite<br>rock : light brownish grey<br>powder : light grey<br>origin : Bimbowrie, South Australia |
| very light beige | 5355 | <u>production process:</u><br>0↑1900 °F (light beige): 1 g + 50 ml sulphuric acid / soaking: 2 wk. / separation of the liquid and the solid / drying on hot plate (colour of the solid: white [beige reflection]) / irradiated with gamma rays at 70.4 Mrad<br>(followed at «pinkish beige») |
| very light beige | 5356 | <u>production process:</u><br>2 g of andulusite + 2 g of sodium carbonate / 0↑1400 °F + 30 min. at 1400 °F (beige) / irradiated with gamma rays at 64.7 Mrad<br>(followed at «brownish beige») |
| | | mineral : apatite<br>rock : reddish brown<br>powder : light pinkish brown<br>origin : Calumet, Pontiac county, Québec |
| very light beige | 5357 | <u>production process:</u><br>3 g of apatite + 20 ml phosphoric acid / soaking: 3 d. / drying on hot plate (still humid) |
| | | mineral : apatite<br>rock : medium brownish red<br>powder : light pinkish beige<br>origin : Ile Calumet, Pontiac county, Québec |
| | | <u>production process:</u><br>1 g of apatite + 1 cc of white opaque synthetic enamel paint used for the car / manual grinding / application on a piece of steel sheet used for the car's body measuring 1" x 1" (very, very light beige [almost white]) / irradiated with gamma rays at: |
| very light beige<br>↓ | 5358 | 57.4 Mrad |
| beige a bit more intense | 5359 | 201.6 Mrad |
| | | mineral : apatite<br>rock : light grass-green (light blue and yellow tones), very slightly translucid<br>powder : very light grey (light green tone)<br>origin : region of Buckingham, Québec |

| | | |
|---|---|---|
| very light beige | 5360 | mineral : sulphur<br>rock : brilliant yellow<br>powder : brilliant yellow<br>origin : unknown<br><br>production process:<br>2 g of apatite + 2 g of sulphur / 1300 °F / 1 h |
| very light beige | 5361 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>1000 °C / 1 h |
| very light beige | 5362 | production process:<br>3 g of apatite + 20 ml ether / natural drying |
| very light beige | 5363 | production process:<br>(followed from «medium brownish grey»)<br>2 g of apatite + 2 g of sodium carbonate:<br>0↑1500 °F + 1 h at 1500 °F |
| ↓ | | |
| very light beige | 5364 | 0↑1600 °F + 1 h at 1600 °F |
| ↓ | | |
| very light beige | 5365 | 0↑1700 °F + 1 h at 1700 °F |
| ↓ | | |
| very light beige | 5366 | 0↑1800 °F + 1 h at 1800 °F |
| ↓ | | |
| very light beige | 5367 | 0↑1900 °F + 1 h at 1900 °F |
| very light beige | 5368 | mineral : apophyllite<br>rock : milky white, translucid<br>powder : white<br>origin : Gaspé Copper Mine, Gaspé, Québec<br><br>production process:<br>1 g of apophyllite + 60 ml sulphuric acid / soaking: 2 wk. / drying on hot plate (white [cream reflection]) / irradiated with electrons at 302,831 rad[36] |
| | | mineral : armenite<br>rock : light grey<br>powder : very light grey<br>origin : Abitibi, Québec |

| | | |
|---|---|---|
| very light beige | 5369 | production process:<br>1 g of armenite + 50 ml sulphuric acid / soaking: 2 wk. / drying on hot plate (white [light beige or grey reflection]) / irradiated with electrons at 302,831 rad[36] |
| very light beige | 5370 | production process:<br>0↑2000 °F |
| very light beige | 5371 | mineral : beryl<br>rock : intense grass-green, slightly translucid<br>powder : greenish grey<br>origin : unknown<br><br>production process:<br>3 g of beryl + 40 ml sulphuric acid / soaking: 18 d. / separation of the liquid and the solid / drying on hot plate (colour of the solid: very, very light iron-grey [with a few «cobalt-blue» particles]) / irradiated with electrons at 164,800 rad<br>(followed at «vivid medium orange») |
| very light beige | 5372 | mineral : beryl<br>rock : light blue, slightly translucid<br>powder : light grey<br>origin : Abitibi, Québec<br><br>production process:<br>(followed from «bluish turquoise more accentuated than "light bluish turquoise"»)<br>2 g of beryl + 2 g of sodium carbonate / 0↑1800 °F + 1 h at 1800 °F |
| very light beige | 5373 | mineral : titanium dioxide #2101<br>powder : white<br>origin : NL Chem Canada Inc., Québec<br><br>production process:<br>irradiated with gamma rays at 64.7 Mrad[89]<br>(followed at «light beige») |
| very light beige, mat | 5374 | mineral : bornite<br>rock : reddish brown (with localized green and bluish green oxidation)<br>powder : reddish brown<br>origin : Lac Musset, Fosse du Labrador, Québec<br><br>production process:<br>12 g of bornite + 40 ml sulphuric acid / soaking: 22 d. / drying on hot plate |

| | | |
|---|---|---|
| very light beige | 5375 | mineral : calcite[11]<br>powder : white<br>origin : Calcite du Nord Company, Saint-Eugène de Mistassini, Lac Saint-Jean, Québec<br><br><u>production process:</u><br>4 g of calcite + 25 ml sulphuric acid / soaking: 24 h / drying on hot plate |
| very light beige | 5376 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br><u>production process:</u><br>1 g of calcite + 1 g of chrome / irradiated with gamma rays at 614.204 Mrad[509,669] |
| very light beige | 5377 | mineral : fluorescent calcite<br>rock : white (localized grey or brown reflection), translucid<br>powder : white (yellow reflection)<br>origin : Bancroft, Ontario<br><br><u>production process:</u><br>4 g of calcite + 20 ml phosphoric acid / soaking: 3 d. / drying on hot plate (still humid) |
| very light beige | 5378 | <u>production process:</u><br>4 g of calcite + 20 ml sulphuric acid / soaking: 3 d. / drying on hot plate (white [light beige reflection]) / irradiated with gamma rays at 64.7 Mrad<br>(followed at «medium greyish beige [pink reflection]») |
| very light beige | 5379 | <u>production process:</u><br>2 g of calcite + 2 g of sodium carbonate / 0↑1500 °F + 45 min. at 1500 °F (white [green reflection]) / irradiated with electrons at 302,831 rad[36] |
| | | mineral : calcite (with clayey inclusions)<br>rock : very light creamy yellow, translucid<br>powder : white<br>origin : De-Mix quarry, near Saint-Philippe de Laprairie, Québec |

988

| | | |
|---|---|---|
| very light beige | 5380 | mineral : sulphur<br>rock : brilliant yellow<br>powder : brilliant yellow<br>origin : unknown<br><br>production process:<br>1 g of calcite + 1 g of sulphur / 1600 °F / 1 h |
| very light beige | 5381 | mineral : cryolite<br>rock : white, crystalline and translucid<br>powder : white<br>origin : Ivigtut, Groenland<br><br>production process:<br>0†1600 °F (white [with yellowish areas]): .20 g + 50 ml sulphuric acid / soaking: 2 wk. / drying on hot plate (white [very light pink reflection]) / irradiated with electrons at 162,431 rad |
| very light beige | 5382 | mineral : dolomite<br>rock : white (localized yellow reflection), crystalline and translucid<br>powder : white<br>origin : Bristol district, Pontiac county, Québec<br><br>production process:<br>1000 °C / 1 h (light cream [yellow tone]) / powder irradiated with electrons at 302,831 rad[36] |
| very light beige | 5383 | production process:<br>(followed from «light cream»)<br>2 g of dolomite + 2 g of sodium carbonate / 1500 °F / 1 h (light grey) / irradiated with electrons at 302,831 rad[45] |
| very light beige | 5384 | mineral : diopside<br>rock : light grey<br>powder : light beige<br>origin : Mont Orford, Québec<br><br>production process:<br>1 g of diopside + 50 ml sulphuric acid / soaking: 2 wk. / drying on hot plate (white [light beige reflection]) / irradiated with gamma rays at 64.7 Mrad<br>(followed at «light beige [light orange tone]») |

| | | |
|---|---|---|
| very light beige | 5385 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml phosphoric acid / soaking: 3 d. / drying on hot plate (still humid) |
| very light beige | 5386 | production process:<br>2 g of fluorine + 20 ml sulphuric acid / soaking: 3 d. / drying on hot plate |
| very light beige | 5387 | mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate |
| very light beige | 5388 | production process:<br>2 g of fluorine + 20 ml sulphuric acid / soaking: 3 d. / drying on hot plate (very light beige) / irradiated with gamma rays at 18.85 Mrad |
| very light beige | 5389 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (medium beige) / irradiated with gamma rays at 18.85 Mrad |
| very light beige | 5390 | mineral : gypsum<br>rock : white (yellow reflection)<br>powder : white (yellow reflection)<br>origin : Geisborough, Nova Scotia<br><br>production process:<br>2 g of gypsum + 20 ml hydrochloric acid / soaking: 3 d. / drying on hot plate (chalk-white [light yellow reflection]) / irradiated with gamma rays at 64.7 Mrad |

990

| | | |
|---|---|---|
| | | (followed at «light orange-beige») |
| very light beige ↓ very light beige | 5391<br>5392 | mineral : kaolin<br>rock : chalk-white (yellow reflection)<br>powder : chalk-white (yellow reflection)<br>origin : Saint-Rémi d'Amherst, Québec<br><br>production process:<br>0↑1900 °F (white [light pink reflection]): .20 g + 25 ml nitric acid / soaking: 2 wk. / drying on hot plate (white [light beige reflection]) / irradiated with electrons at:<br>162,431 rad<br><br>302,831 rad[45] |
| very light beige | 5393 | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>4 g of mica + 50 ml sulphuric acid / soaking: 4 wk. / drying on hot plate |
| very light beige | 5394 | mineral : microcline<br>rock : white (grey reflection)<br>powder : white (grey reflection)<br>origin : Buckingham, Québec<br><br>production process:<br>0↑1900 °F (light grey): .50 g + 50 ml sulphuric acid / soaking: 2 wk. / drying on hot plate (white [light beige reflection]) / irradiated with gamma rays at 64.7 Mrad<br>(followed at «medium beige [light pink tone]») |
| very light beige | 5395 | mineral : amazon stone<br>rock : light greenish turquoise, translucid<br>powder : white (turquoise reflection)<br>origin : unknown<br><br>production process:<br>(suite de «white [light grey reflection]»)<br>4 g of amazon + 40 ml nitric acid / soaking: 1 wk. / separation of the liquid and the solid / natural drying (colour of the solid: white [light blue reflection]) / irradiated with gamma rays at 424.7 Mrad |

| | | |
|---|---|---|
| very light beige | 5396 | production process:<br>4 g of amazon + 40 ml hydrochloric acid / soaking: 1 wk. / separation of the liquid and the solid / natural drying (colour of the solid: white [apple-green reflection]) / irradiated with gamma rays at 64.7 Mrad<br>(followed at «mixture of particles: pale brown / dark brown») |
| | | mineral : orthoclase<br>rock : white (grey reflection)<br>powder : white (grey reflection)<br>origin : mine near Buckingham, Papineau county, Québec |
| very light beige | 5397 | production process:<br>2 g of orthoclase + 20 ml nitric acid / soaking: 3 d. / drying on hot plate (white [light yellow reflection]) / irradiated with gamma rays at 63.88 Mrad<br>(followed at «medium orange-beige») |
| very light beige | 5398 | production process:<br>2 g of orthoclase + 20 ml hydrochloric acid / soaking: 3 d. / drying on hot plate (white [light yellow reflection]): .3 g + 50 cc of transparent polyester resin + 1% of catalyst / manual grinding / moulding / hardening (very, very light greenish grey) / irradiated with gamma rays at 5.7 Mrad |
| | | mineral : orthoclase<br>rock : light pinkish beige<br>powder : very light beige<br>origin : mine near Buckingham, Papineau county, Québec |
| very light beige | 5399 | production process:<br>2 g of orthoclase + 20 ml ether / natural drying |
| very light beige | 5400 | production process:<br>2 g of orthoclase + 20 ml ammonia / natural drying |
| | | mineral : pyrophillite<br>rock : light beige (grey and pink tones), opaque<br>powder : very light beige (grey and orange-pink tones)<br>origin : Carpentier district, Abitibi, Québec |

| | | |
|---|---|---|
| very light beige | 5401 | <u>production process:</u><br>2 g of pyrophillite + 2 g of sodium carbonate / 0↑1500 °F + 1 h at 1500 °F<br>(followed at «light greenish blue [grey tone]») |
| very light beige | 5402 | mineral : serpentine<br>rock : yellowish green<br>powder : light greenish yellow<br>origin : probably Thetford Mines, Eastern Townships, Québec<br><br><u>production process:</u><br>2 g of serpentine + 2 g of potassium carbonate / 0↑1500 °F<br>(followed at «light greenish beige») |
| | | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br><u>production process:</u><br>powder[670] irradiated with gamma rays at: |
| very light grey | 5403 | 5 Mrad |
| which evolves | 5404 | 10 Mrad |
| ↓ towards | 5405 | 57.4 Mrad |
| ↓ | 5406 | 102.4 Mrad |
| ↓ | 5407 | 148.4 Mrad |
| very light beige | 5408 | 190.22 Mrad |
| which accentuates | 5409 | 201.6 Mrad |
| itself progressi- | 5410 | 247.6 Mrad |
| vely ↓ | 5411 | 287.3 Mrad |
| ↓ | 5412 | 360 Mrad |
| | | (followed at «medium beige») |
| very light beige | 5413 | mineral : kaolin<br>rock : chalk-white (yellow reflection)<br>powder : chalk-white (yellow reflection)<br>origin : Saint-Rémi d'Amherst, Québec<br><br><u>production process:</u><br>0↑1900 °F (white [light pink reflection]): .20 g + 50 ml hydrochloric acid / soaking: 2 wk. / drying on hot plate (white) / irradiated with electrons at 162,431 rad<br>(followed at «pure white») |
| | | mineral : stibnite<br>rock : dark grey, with metallic brilliance |

| | | |
|---|---|---|
| very light beige | 5414 | powder : dark grey, with metallic brilliance<br>origin : Hunan, China<br><br>production process:<br>5 g of stibnite + 20 ml phosphoric acid / soaking: 3 d. / drying on hot plate (still humid) |
| very light beige | 5415 | mineral : stilbite<br>rock : white (honey reflection)<br>powder : white (honey reflection)<br>origin : Lac d'amiante Mine, Black Lake, Québec<br><br>production process:<br>3 g of stilbite + 40 ml sulphuric acid / soaking: 16 d. / drying on hot plate (white [beige reflection]) / irradiated with electrons at 164,800 rad (followed at «light beige») |
| very light beige | 5416 | mineral : vesuvianite<br>rock : lilac<br>powder : lilac<br>origin : John Mansville Mine, Asbestos, Québec<br><br>production process:<br>(followed from «chamois a bit darker than "light chamois"»)<br>1600 °F / 15 h (chamois) / powder irradiated with electrons at 305,200 rad[73] |
| beige more pronounced than «very light beige» | 5417 | mineral : armenite<br>rock : light grey<br>powder : very light grey<br>origin : Abitibi, Québec<br><br>production process:<br>0↑2000 °F (very light beige) / powder irradiated with gamma rays at 64.7 Mrad<br>(followed at «medium orange-beige») |
| beige a bit more accentuated than «very light beige» | 5418 | mineral : pyrophillite<br>rock : light beige (grey and pink tones), opaque<br>powder : very light beige (grey and orange-pink tones)<br>origin : Carpentier district, Abitibi, Québec<br><br>production process:<br>rock hermetically wrapped in bread dough / irradiated with gamma rays at 4.88 Mrad |

| | | |
|---|---|---|
| beige much more pronounced than «very light beige» | 5419 | mineral : orthoclase<br>rock : white (grey reflection)<br>powder : white (grey reflection)<br>origin : mine near Buckingham, Papineau county, Québec<br><br>production process:<br>1000 °C / 1 h (very, very light pinkish beige [almost white]) / powder irradiated with gamma rays at 64.7 Mrad<br>(followed at «light beige-orange») |
| beige much more intense and dark than «very light beige» | 5420 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>(followed from «greenish beige»)<br>1000 °C / 1 h (very light beige) / powder irradiated with gamma rays at 122.984 Mrad<br><br>(followed at «dark orange-beige») |
| beige darker than «very light beige» | 5421 | production process:<br>2 g of apatite + 2 g of sodium carbonate / 0↑1800 °F + 1 h at 1800 °F (very light beige) / irradiated with gamma rays at 64.7 Mrad<br>(followed at «light greyish beige») |
| beige a bit darker than «very light beige» | 5422 | mineral : sodium carbonate<br>powder : white<br>origin : Anachemia Company, Montréal, Québec<br><br>production process:<br>(followed at «beige»)<br>1900 °F / 1 h (very light pinkish beige) / irradiated with gamma rays at 424.7 Mrad |
| beige darker than «very light beige» | 5423 | mineral : steatite<br>rock : light cold grey, slightly translucid<br>powder : light grey<br>origin : East Broughton, Québec<br><br>production process:<br>20 g of steatite + 100 ml nitric acid / soaking: 5 months / natural drying: .3 g + 50 cc of transpa- |

| | | |
|---|---|---|
| | | rent polyester resin + 1% of catalyst / manual grinding / moulding / hardening (very light beige [light yellow tone]) / irradiated with electrons at 155,082 rad<br>(followed at «beige-yellow») |
| beige much darker than «very light beige» | 5424 | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>4 g of mica + 50 ml sulphuric acid / soaking: 4 wk. / drying on hot plate (very light beige) / irradiated with gamma rays at 64.7 Mrad<br>(followed at «light beige [very light pinkish orange tone]») |
| beige much darker than «very light beige» | 5425 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>3 g of wilsonite + 50 ml nitric acid / soaking: 2 wk. / drying on hot plate (very light beige [orange-pink tone]) / irradiated with gamma rays at 64.7 Mrad<br>(followed at «very dark beige [orange-yellow tone]») |
| beige a bit more pale than «light beige» | 5426 | mineral : sericite shale<br>rock : light grey (green reflection)<br>powder : very, very light grey<br>origin : Magog, Québec<br><br>production process:<br>2 g of shale + 2 g of sodium carbonate / 0↑1500 °F + 15 min. at 1500 °F (light beige [very light orange tone]) / irradiated with electrons at 302,831 rad[36] |
| | | mineral : analcime<br>rock : white (grey reflection), crystalline and translucid<br>powder : light grey<br>origin : De-Mix quarry, North side of Mont |

| | | |
|---|---|---|
| | | Saint-Hilaire, Rouville county, Québec<br><br>production process: |
| beige lighter than «light beige» | 5427 | 1 g of analcime + 50 ml nitric acid / soaking: 2 wk. / drying on hot plate (light beige) / irradiated with electrons at 163,431 rad<br>(followed at «very, very light beige») |
| | | mineral : actinolite<br>rock : cold and light evergreen<br>powder : light grey (light green tone)<br>origin : erratic block found at Saint-Philémon near Dorchester, Québec<br><br>production process:<br>2 g of actinolite + 2 g of sodium carbonate: |
| light beige which | 5428 | 0↑1200 °F + 1 h at 1200 °F |
| ↓ darkens and | 5429 | 0↑1300 °F + 1 h at 1300 °F |
| becomes more brown | 5430 | 0↑1400 °F + 1 h at 1400 °F<br>(followed at «orange-beige») |
| | | mineral : Gaspé agate<br>rock : marbled nodule with shaded tints of white, pink and light grey, slightly translucid<br>powder : very light pinkish grey<br>origin : Mont Lyall, Gaspésie, Québec<br><br>production process: |
| light beige | 5431 | 4 g of agate + 40 ml nitric acid / soaking: 1 wk. / separation of the liquid and the solid / natural drying (colour of the solid: white) / irradiated with gamma rays at 64.7 Mrad<br>(followed at «mixture of particles: beige / brown») |
| | | mineral : blue lace agate<br>rock : light violet-blue, slightly translucid<br>powder : very light grey<br>origin : Africa<br><br>production process: |
| light beige | 5432 | 3 g of agate + 40 ml nitric acid / soaking: 1 wk. / separation of the liquid and the solid / natural drying (colour of the solid: white [green reflection]) / irradiated with gamma rays at 424.7 Mrad[e1] |
| | | production process:<br>(followed from «white [beige or grey reflection]») |

| | | |
|---|---|---|
| light beige | 5433 | rock hermetically wrapped in bread dough / 1600 °F / 1 h (white, opaque) / irradiated with gamma rays at 424.7 Mrad |
| light beige | 5434 | production process:<br>(followed from «light apple-green»)<br>3 g of agate + 40 ml nitric acid / soaking: 1 wk. / separation of the liquid and the solid / natural drying (colour of the liquid: pronounced greenish turquoise) / irradiated with gamma rays at 424.7 Mrad |
| light beige | 5435 | production process:<br>3 g of agate + 40 ml hydrochloric acid / soaking: 1 wk. / separation of the liquid and the solid / natural drying (colour of the liquid: light and vivid apple-green) / irradiated with gamma rays at 64.7 Mrad<br>(followed at «mixture of particles: beige / brown») |
| light beige | 5436 | mineral : sardonyx<br>rock : white, slightly translucid (with a light orange-amber circular area on the surface)<br>powder : very light grey<br>origin : unknown<br><br>production process:<br>4 g of sardonyx + 40 ml hydrochloric acid / soaking: 14 d. / separation of the liquid and the solid / drying on hot plate (colour of the solid: very light pinkish beige [with a few green particles]) / irradiated with electrons at 164,800 rad<br>(followed at «light greyish brown») |
| light beige | 5437 | production process:<br>4 g of sardonyx + 40 ml hydrochloric acid / soaking: 14 d. / separation of the liquid and the solid / natural drying (colour of the solid: pale apple-green) / irradiated with gamma rays at 64.7 Mrad<br>(followed at «mixture of particles: honey-yellow [orange tone] / dark brown») |
| | | mineral : agate<br>rock : grey (with a light orange circular area on the surface), slightly translucid<br>powder : very light grey<br>origin : unknown |

| | | |
|---|---|---|
| light beige | 5438 | production process:<br>(followed from «very light beige»)<br>3 g of agate + 40 ml sulphuric acid / soaking: 14 d. / drying on hot plate (very light brownish grey [with a few green particles]) / irradiated with electrons at 305,200 rad[73] |
| light beige | 5439 | mineral : amazonite<br>rock : greenish turquoise<br>powder : white (turquoise reflection)<br>origin : Lac Saint-Jean, Québec<br><br>production process:<br>2 g of amazonite + 20 ml hydrochloric acid / soaking: 3 d. / drying on hot plate (light green): .2 g + 50 cc of transparent polyester resin + 1% of catalyst / manual grinding / moulding / hardening (very light grey [light yellow reflection]) / irradiated with electrons at 155,082 rad<br>(followed at «grey [yellow reflection]») |
| light beige | 5440 | production process:<br>2 g of amazonite + 20 ml sulphuric acid / soaking: 3 d. / drying on hot plate (cream [very light green tone]): .2 g + 50 cc of transparent polyester resin + 1% of catalyst / manual grinding / moulding / hardening (light grey [light yellow reflection]) / irradiated with electrons at 155,082 rad<br>(followed at «dark greenish yellow») |
| light beige | 5441 | mineral : amethyst<br>rock : light violet, translucid<br>origin : Lac Sairs, Témiscamingue, Québec<br><br>production process:<br>(followed from «violet-grey»)<br>1600 °F / 1 h (chalk-white [grey reflection]) / rock irradiated with gamma rays at 424.7 Mrad |
| | | mineral : asbestos[4]<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Québec |

| | | |
|---|---|---|
| light beige | 5442 | production process:<br>50 g of asbestos + 200 ml hydrochloric acid or asbestos entirely covered with hydrochloric acid / soaking: 1 wk. / drying on hot plate (vivid yellow): .50 g + .50 g of zirconium silicate / 1600 °F / 1 h<br>(followed at «chamois») |
| light beige | 5443 | mineral : asbestos[4]<br>rock : dark grey (green reflection)<br>powder : light grey (green reflection)<br>origin : Asbestos Corporation Ltd., Thetford Mines, Québec<br><br>production process:<br>50 g of asbestos + 200 ml hydrochloric acid or asbestos entirely covered with hydrochloric acid / soaking: 1 wk. / drying on hot plate (vivid yellow) / 1600 °F / 1 h |
| light beige<br>↓ | 5444 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>(followed from «orange-chamois»)<br>0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 2 g + 12 g of sulphur / 1300 °F / 1 h[638] |
| slightly lighter beige | 5445 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green tone]): 2 g + 24 g of sulphur / 1300 °F / 1 h[638]<br>(followed at «pinkish chamois») |
| | | mineral : analcime<br>rock : white (grey reflection), crystalline and translucid |

1000

| | | |
|---|---|---|
| | | powder : light grey<br>origin : De-Mix quarry, North side of Mont Saint-Hilaire, Rouville county, Québec<br><br>production process:<br>1 g of analcime + 50 ml sulphuric acid / soaking: 2 wk. / drying on hot plate (white) / irradiated with gamma rays at 64.7 Mrad (followed at «medium brownish orange») |
| light beige | 5446 | |
| light beige | 5447 | production process:<br>1 g of analcime + 50 ml nitric acid / soaking: 2 wk. / drying on hot plate[672] |
| light beige | 5448 | production process:<br>(followed from «white [light yellow reflection]») rock irradiated with gamma rays at 482.984 Mrad[673] |
| light beige | 5449 | mineral : andulusite<br>rock : light brownish grey<br>powder : light grey<br>origin : Bimbowrie, South Australia<br><br>production process:<br>0↑1900 °F |
| cold and light beige | 5450 | production process:<br>2 g of andulusite + 2 g of sodium carbonate / 0↑1300 °F + 1 h at 1300 °F (light orange-beige) / irradiated with gamma rays at 63.88 Mrad (followed at «medium brownish beige») |
| light beige | 5451 | mineral : antigorite<br>rock : pale yellowish green<br>powder : very pale greenish yellow<br>origin : Canadian Refractories Mine, Kilmar, Québec<br><br>production process:<br>powder irradiated with gamma rays at 64.7 Mrad (followed at «orange-beige») |
| light beige | 5452 | production process:<br>2 g of antigonite + 20 ml sulphuric acid / soaking: 3 d. / drying on hot plate |
| | | mineral : apatite<br>rock : pale brownish green |

| | | |
|---|---|---|
| | | powder : very light greyish green<br>origin : Black Lake, Thetford county, Québec<br><br>production process:<br>2 g of apatite + 25 ml sulphuric acid / soaking: 24 h / drying on hot plate (white): .3 g + 50 cc of transparent polyester resin + 1% of catalyst / manual grinding / moulding / hardening (ivory [light orange reflection]) / irradiated with gamma rays at 5.7 Mrad |
| light beige | 5453 | |
| light beige | 5454 | production process:<br>(followed from «ivory [yellowish orange reflection]»)<br>2 g of apatite + 25 ml sulphuric acid / soaking: 24 h / drying on hot plate (white): .3 g + 50 cc of transparent polyester resin + 1% of catalyst / manual grinding / moulding / hardening (ivory [light orange reflection]) / irradiated with electrons at 305,082 rad |
| light beige | 5455 | mineral : apatite<br>rock : reddish brown<br>powder : light pinkish beige<br>origin : Calumet, Pontiac county, Québec<br><br>production process:<br>3 g of apatite + 20 ml hydrochloric acid / soaking: 3 d. / drying on hot plate (light grey): .2 g + 50 cc of transparent polyester resin + 1% of catalyst / manual grinding / moulding / hardening (very light iron-grey [light yellow reflection]) / irradiated with electrons at 155,082 rad<br>(followed at «dark greyish yellow») |
| light beige | 5456 | production process:<br>3 g of apatite + 25 ml nitric acid / soaking: 3 d. / drying on hot plate (light beige): .2 g + 50 cc of transparent polyester resin + 1% of catalyst / manual grinding / moulding / hardening (very, very light yellowish grey) / irradiated with electrons at 155,082 rad<br>(followed at «dark greenish yellow») |
| light beige | 5457 | production process:<br>.2 g of apatite + 50 cc of transparent polyester resin + 1% of catalyst / manual grinding / moulding / hardening (very light greyish beige [light yellow reflection]) / irradiated with electrons at 155,082 rad |

1002

| | | |
|---|---|---|
| | | (followed at «greyish beige [light yellow reflection]») |
| light beige | 5458 | <u>production process:</u><br>3 g of apatite + 25 ml nitric acid / soaking: 3 d. / drying on hot plate |
| light beige | 5459 | mineral : apatite<br>rock : light grass-green (light blue and yellow tones), very slightly translucid<br>powder : very light grey (light green tone)<br>origin : region of Buckingham, Québec<br><br>mineral : calcite[11]<br>powder : white<br>origin : Calcite du Nord Company, Saint-Eugène de Mistassini, Lac Saint-Jean, Québec<br><br><u>production process:</u><br>1 g of apatite + 1 g of calcite / 1000 °C / 1 h |
| light beige | 5460 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br><u>production process:</u><br>3 g of apatite + 20 ml sulphuric acid / soaking: 3 d. / drying on hot plate |
| light beige | 5461 | <u>production process:</u><br>3 g of apatite + 20 ml ammonia / natural drying |
| light beige | 5462 | <u>production process:</u><br>.3 g of apatite + 50 cc of transparent polyester resin + 1% of catalyst / manual grinding / hardening (very light grey [light yellow reflection]) / irradiated with electrons at 155,082 rad (followed at «dark yellow») |
| light beige | 5463 | <u>production process:</u><br>1000 °C / 1 h (very light beige) / powder irradiated with electrons at 302,831 rad[36] |
| | | mineral : apophyllite |

1003

| | | |
|---|---|---|
| light beige | 5464 | rock : milky white, translucid<br>powder : white<br>origin : Gaspé Copper Mine, Gaspé, Québec<br><br>production process:<br>1 g of apophyllite + 60 ml sulphuric acid / soaking: 2 wk. / drying on hot plate (white [creamy reflection]) / irradiated with gamma rays at 64.7 Mrad<br>(followed at «dark greyish beige [light orange tone]») |
| light beige | 5465 | mineral : barite<br>rock : pinkish white<br><br>powder : white<br>origin : Niobec Mine, Saint-Honoré, Saguenay, Québec<br><br>production process:<br>(followed from «beige-cream»)<br>2 g of barite + 2 g of sodium carbonate / 0↑1700 °F + 1 h at 1700 °F (very light cream) / irradiated with gamma rays at 424.7 Mrad |
| light beige | 5466 | production process:<br>rock entirely covered with 20 ml hydrochloric acid / soaking: 2 wk. / irradiated with gamma rays at 5.7 Mrad / drying on sand bath, completed on hot plate[675] |
| light beige | 5467 | mineral : beryl<br>rock : light blue, slightly translucid<br>powder : light grey<br>origin : Abitibi, Québec<br><br>production process:<br>2 g of beryl + 25 ml nitric acid / soaking: 24 h / drying on hot plate (light blue [light green or yellow tone]): .3 g + 50 cc of transparent polyester resin + 1% of catalyst / manual grinding / moulding / hardening (very light yellow or green) / irradiated with electrons at 155,082 rad<br>(followed at «greenish grey») |
| light beige | 5468 | production process:<br>2 g of beryl + 25 ml sulphuric acid / soaking: 24 h / drying on hot plate (very light greyish beige): .3 g + 50 cc of transparent polyester resin + 1% of catalyst / manual grinding / moulding / hardening (light brownish grey) / irradiated with electrons at 155,082 rad<br>(followed at «light yellow») |

1004

| | | |
|---|---|---|
| light beige | 5469 | <u>production process:</u><br>2 g of beryl + 20 ml hydrofluoric acid / soaking: 24 h / drying in oven at 100 °F (mixture of particles: light beige / light blue): .3 g + 50 cc of transparent polyester resin + 1% of catalyst / manual grinding / moulding / hardening (cold and light greenish grey) / irradiated with electrons at 155,082 rad<br>(followed at «yellowish green») |
| light beige | 5470 | <u>production process:</u><br>2 g of beryl + 2 g of sodium carbonate / 0↑1500 °F + 1 h at 1500 °F (very light azure-blue) / irradiated with gamma rays at 63.88 Mrad<br>(followed at «medium greyish beige») |
| light beige<br>↓ | 5471 | <u>production process:</u><br>2 g of beryl + 2 g of sodium carbonate / 0↑1500 °F + 1 h at 1500 °F (very light azure-blue) / irradiated with electrons at:<br>162,431 rad |
| light accentuated beige | 5472 | 302,831 rad[45] |
| light beige | 5473 | mineral : beryl<br>rock : intense grass-green, slightly translucid<br>powder : greenish grey<br>origin : unknown<br><br><u>production process:</u><br>(followed from «medium pinkish beige»)<br>3 g of beryl + 40 ml sulphuric acid / soaking: 18 d. / separation of the liquid and the solid / drying on hot plate (colour of the solid: very, very light iron-grey [with a few «cobalt-blue» particles]) / irradiated with gamma rays at 425.65 Mrad[676] |
| light beige | 5474 | <u>production process:</u><br>3 g of beryl + 40 ml sulphuric acid / soaking: 18 d. / separation of the liquid and the solid / drying on hot plate (colour of the liquid: very, very light grey [with a few «cobalt-blue» particles]) / irradiated with electrons at 164,800 rad<br>(followed at «light beige [pinkish orange tone]») |
| | | mineral : beryl<br>rock : very light yellowish green, slightly translucid<br>powder : white (green reflection) |

1005

| | | |
|---|---|---|
| light beige | 5475 | origin : Lacorne district, Abitibi, Québec<br><br>production process:<br>2 g of beryl + 2 g of sodium carbonate / 0↑1300 °F + 1 h at 1300 °F (medium brownish beige [pink and grey tones]) / irradiated with electrons at 302,831 rad[36] |
| light beige | 5476 | mineral : beryl<br>rock : very light yellowish green, slightly translucid<br>powder : white (green reflection)<br>origin : Lacorne district, Abitibi, Québec<br><br>mineral : calcite[11]<br>powder : white<br>origin : Calcite du Nord Company, Saint-Eugène de Mistassini, Lac Saint-Jean, Québec<br><br>production process:<br>1 g of beryl + 1 g of calcite / 1000 °C / 1 h |
| light beige<br>↓<br>light beige | 5477<br><br>5478 | mineral : titanium dioxide #Tx-2071-4<br>powder : white<br>origin : NL Chem Canada Inc., Québec<br><br>production process:<br>irradiated with gamma rays at:<br>64.7 Mrad<br><br>424.7 Mrad |
| light beige<br>↓<br>slightly more accentuated beige | 5479<br><br>5480 | mineral : titanium dioxide #2020<br>powder : white<br>origin : NL Chem Canada Inc., Québec<br><br>production process:<br>irradiated with gamma rays at:<br>64.7 Mrad[89]<br><br>424.7 Mrad[677] |
| light beige<br>↓<br>slightly more | 5481<br><br>5482 | mineral : titanium dioxide #2101-1<br>powder : white<br>origin : NL Chem Canada Inc., Québec<br><br>production process:<br>irradiated with gamma rays at:<br>64.7 Mrad[89]<br><br>424.7 Mrad[677] |

1006

| | | |
|---|---|---|
| accentuated beige | | |
| light beige | 5483 | mineral : titanium dioxide #2101<br>powder : white<br>origin : NL Chem Canada Inc., Québec<br><br>production process:<br>(followed from «very light beige»)<br>irradiated with gamma rays at 424.7 Mrad[677] |
| light beige<br>↓<br>light beige | 5484<br><br>5485 | mineral : titanium dioxide #1000<br>powder : white<br>origin : NL Chem Canada Inc., Québec<br><br>production process:<br>irradiated with gamma rays at:<br>64.7 Mrad<br><br>424.7 Mrad[678] |
| light beige<br>↓<br>light beige | 5486<br><br>5487 | mineral : titanium dioxide #2073<br>powder : white<br>origin : NL Chem Canada Inc., Québec<br><br>production process:<br>irradiated with gamma rays at:<br>64.7 Mrad<br><br>424.7 Mrad[677] |
| light beige<br>↓<br>light beige | 5488<br><br>5489 | mineral : titanium dioxide #2071<br>powder : white<br>origin : NL Chem Canada Inc., Québec<br><br>production process:<br>irradiated with gamma[433] rays at:<br>124.704 Mrad<br><br>484.704 Mrad[677] |
| light beige | 5490 | mineral : limestone [645]<br>rock : white opaque (yellow reflection)<br>origin : region of Montréal, Québec<br><br>production process:<br>(followed from «very, very light yellowish beige»)<br>rock irradiated with gamma[67] rays at 482.984 Mrad |
| | | mineral : calcite[11]<br>powder : white<br>origin : Calcite du Nord Company, Saint-Eugène de Mistassini, Lac Saint-Jean, Québec |

1007

| | | |
|---|---|---|
| light beige | 5491 | production process:<br>.3 g of calcite + 50 cc of transparent polyester resin + 1% of catalyst / manual grinding / moulding / hardening (very light grey [light yellow reflection]) / irradiated with electrons at 155,082 rad<br>(followed at «grey [yellow reflection]») |
| light beige | 5492 | production process:<br>44 g of calcite + 100 ml phosphoric acid / soaking: 3 wk. / drying on hot plate [still humid] (very light grey): .3 g + 50 cc of transparent polyester resin + 1% of catalyst / manual grinding / moulding / hardening (very pale brownish grey) / irradiated with electrons at 155,082 rad<br>(followed at «brownish grey [light greenish yellow reflection]») |
| light beige | 5493 | mineral : fluorescent calcite<br>rock : white (localized grey or brown reflection), translucid<br>powder : white (yellow reflection)<br>origin : Bancroft, Ontario<br><br>production process:<br>4 g of calcite + 20 ml sulphuric acid / soaking: 3 d. / drying on hot plate (white [light beige reflection]): .3 g + 50 cc of transparent polyester resin + 1% of catalyst / manual grinding / moulding / hardening (light grey [yellow reflection]) / irradiated with electrons at 155,082 rad<br>(followed at «pale greyish yellow») |
| light beige | 5494 | production process:<br>4 g of calcite + 20 ml sulphuric acid / soaking: 3 d. / drying on hot plate (white [light beige reflection]) / irradiated with electrons at 162,431 rad |
| light beige | 5495 | production process:<br>2 g of calcite + 2.50 g of sodium carbonate / 1700 °F / 1 h (emerald-green) / irradiated with gamma rays at 64.7 Mrad<br>(followed at «medium beige») |
| | | mineral : calcite (with clayey inclusions)<br>rock : very light creamy yellow, translucid<br>powder : white<br>origin : De-Mix quarry, near Saint-Philippe de |

1008

| | | |
|---|---|---|
| | | Laprairie, Québec<br><br>production process:<br>(followed from «creamy grey»)<br>1 g of calcite + 1 cc of white transparent synthetic enamel paint used for the car / manual grinding / application on a piece of steel sheet used for the car's body measuring 1" x 1" (light yellowish cream) / irradiated with gamma[351,352] rays at: |
| light beige | 5496 | 11.31 Mrad |
| ↓ | | |
| beige a bit darker | 5497 | 18.85 Mrad<br>(followed at «creamy beige») |
| light beige | 5498 | production process:<br>1 g of calcite + 1 g of sodium carbonate / 1600 °F / 1 h |
| light beige | 5499 | mineral : calcite<br>rock : light pink<br>powder : pinkish white<br>origin : Huddersfield district, Pontiac county, Québec<br>production process:<br>(followed from «cream»)<br>2 g of calcite + 2 g of sodium carbonate / 0↑1600 °F + 1 h at 1600 °F (cream a bit darker than «very light cream») / irradiated with gamma rays at 424.7 Mrad |
| light beige | 5500 | production process:<br>4 g of calcite + 20 ml sulphuric acid / soaking: 3 d. / drying on hot plate (light beige [localized light pink tone]): .3 g + 50 cc of transparent polyester resin + 1% of catalyst / manual grinding / moulding / hardening (light lemon-yellow) / irradiated with electrons at 155,082 rad<br>(followed at «dark and intense greenish yellow») |
| light beige | 5501 | production process:<br>(followed from «white [beige reflection]»)<br>powder irradiated with gamma rays at 424.7 Mrad<br>(followed at «medium beige [light pinkish orange tone]») |
| light beige | 5502 | production process:<br>1600 °F / 1 h (brownish grey or grey-brown [between «dark brownish grey or greyish brown» and «blackish brownish grey or greyish brown»]) / rock irradiated with electrons at 164,800 rad<br>(followed at «medium greyish beige») |

1009

| | | |
|---|---|---|
| light beige | 5503 | mineral : cerite<br>rock : dark brownish grey<br>powder : light grey (light brown tone)<br>origin : Jamestown, Boulder county, Colorado, United States<br><br>production process:<br>4 g of cerite + 100 ml sulphuric acid / soaking: 2 wk. / drying on hot plate (white) / irradiated with electrons at 162,431 rad |
| light beige | 5504 | mineral : coal<br>rock : black<br>powder : brownish black<br>origin : bank of St.-Lawrence river, city of Québec, Québec<br><br>production process:<br>2 g of coal + 2 g of sodium carbonate / 0↑1500 °F + 45 min. at 1500 °F (mint-green [malachite-green type]) / irradiated with gamma rays at 64.7 Mrad |
| light beige | 5505 | mineral : cement[a2]<br>powder : medium cold grey<br>origin : Union des Carrières, Limoilou, Québec<br><br>production process:<br>45 g of cement + 100 ml sulphuric acid or cement entirely covered with sulphuric acid / soaking: 3 months / drying on hot plate (medium grey [yellow tone]) / irradiated with gamma rays at 64.7 Mrad (followed at «greyish beige») |
| light beige | 5506 | mineral : zinc concentrate grilled at 1000 °C ($ZnO-FeO)(SO_4)$<br>powder : reddish brown<br>origin : Zinc Electrolytic du Canada Company, Montréal, Québec<br><br>production process:<br>4 g of concentrate + 100 ml sulphuric acid / soaking: 3 wk. / drying on hot plate (yellow lighter than «light yellow») / irradiated with gamma rays at 64.7 Mrad<br>(followed at «medium milky chocolate-brown [orange-pink reflection]») |
| | | mineral : corundum<br>rock : medium grey<br>powder : light grey |

| | | |
|---|---|---|
| light beige | 5507 | origin : Transvaal, Africa<br><br>production process:<br>1 g of corundum + 50 ml sulphuric acid / soaking: 2 wk. / drying on hot plate (very light cream) / irradiated with gamma rays at 70.4 Mrad (followed at «medium chocolate-brown [orange tone]») |
| light beige | 5508 | production process:<br>0↑1900 °F (brownish grey): 1 g + 50 ml hydrochloric acid / soaking: 2 wk. / drying on hot plate (light yellowish brown) / irradiated with electrons at 162,431 rad[24]<br>(followed at «brownish grey») |
| white which evolves towards<br>↓<br>light beige | 5509<br>5510<br>5511<br>5512<br>5513<br>5514 | mineral : cryolite<br>rock : white, crystalline and translucid<br>powder : white<br>origin : Ivigtut, Groenland<br><br>production process:<br>powder irradiated with gamma rays at:<br>5 Mrad<br>10 Mrad<br>57.4 Mrad<br>65.704 Mrad<br>102.4 Mrad<br>124.704 Mrad<br>(followed at «light orange-beige») |
| light beige | 5515 | mineral : cryolite<br>rock : white, crystalline and translucid<br>powder : white<br>origin : Ivigtut, Groenland<br><br>mineral : sulphur<br>rock : brilliant yellow<br>powder : brilliant yellow<br>origin : unknown<br><br>production process:<br>2 g of cryolite + 2 g of sulphur / 1300 °F / 1 h |
| light beige | 5516 | mineral : diopside<br>rock : light grey<br>powder : light beige<br>origin : Mont Orford, Québec<br><br>production process:<br>0↑1900 °F (medium brown): .10 g + 80 ml phosphoric acid / soaking: 2 wk. / drying on hot plate (still |

1011

| | | |
|---|---|---|
| | | humid) / colour of the solid° |
| light beige | 5517 | mineral : dolomite<br>rock : light grey<br>powder : light grey<br>origin : Shefferville, Ungava, Québec<br><br>production process:<br>2 g of dolomite + 20 ml sulphuric acid / soaking: 3 d. / drying on hot plate |
| light beige | 5518 | production process:<br>0↑1000 °C |
| light beige | 5519 | production process:<br>(followed from «mixture of particles: light green / beige»)<br>2 g of dolomite + 2 g of sodium carbonate / 0↑1600 °F + 1 h at 1600 °F<br>(followed at «mixture of particles: olive-green / beige») |
| light beige | 5520 | mineral : dolomite<br>rock : white (localized yellow reflection), crystalline and translucid<br>powder : white<br>origin : Bristol district, Pontiac county, Québec<br><br>production process:<br>2 g of dolomite + 2 g of sodium carbonate / 1500 °F / 1 h (light grey) / irradiated with gamma rays at 64.7 Mrad<br>(followed at «light pinkish beige») |
| light beige | 5521 | production process:<br>2 g of dolomite + 20 ml hydrofluoric acid / soaking: 24 h / drying in oven at 100 °F (white [yellow reflection]) / irradiated with gamma rays at 64.7 Mrad<br>(followed at «medium beige») |
| the rock has 2 areas: light beige / orange-brown | 5522 | mineral : solid epidote<br>rock : green (light brown tone [olive-green type])<br>powder : grey (greenish brown tone)<br>origin : Deloro Road, Madoc, Ontario<br><br>production process:<br>0↑1700 °F677a |

| | | |
|---|---|---|
| light beige | 5523 | mineral : fluorine<br>rock : colourless<br>powder : colourless<br>origin : unknown<br><br><u>production process:</u><br>2 g of fluorine + 20 ml hydrofluoric acid / soaking: 24 h / drying in oven at 100 °F (creamy white [grey reflection]): .3 g + 50 cc of transparent polyester resin + 1% of catalyst / manual grinding / moulding / hardening (very light grey) / irradiated with electrons at 305,082 rad[354] |
| light beige | 5524 | mineral : fluorine<br>rock : violet and white, translucid<br>powder : very light grey<br>origin : Saint-Lawrence Fluorspar Company, Saint-Lawrence, Newfoundland<br><br><u>production process:</u><br>(followed from «light greyish cream»)<br>1 g of fluorine + 1 cc of white transparent synthetic enamel paint used for the car[94] / manual grinding / application on a piece of steel sheet measuring 1" x 1" (light grey) / irradiated with gamma[351,352] rays at 57.4 Mrad<br>(followed at «medium rusty brown») |
| light beige | 5525 | <u>production process:</u><br>2 g of fluorine + 20 ml sulphuric acid / soaking: 3 d. / drying on hot plate (light brown): .2 g + 50 cc of transparent polyester resin + 1% of catalyst / manual grinding / moulding / hardening (greenish yellow) / irradiated with electrons at 155,082 rad<br>(followed at «greenish yellow») |
| light beige | 5526 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>2 g of fluorine + 20 ml nitric acid / soaking: 3 d. / drying on hot plate (light beige-orange): .2 g + 50 cc of transparent polyester resin + 1% of catalyst / manual grinding / moulding / hardening (very light grey [light yellow reflection]) / irradiated with electrons at 155,082 rad<br>(followed at «yellow [grey or brown tone]») |

1013

| | | |
|---|---|---|
| light beige | 5527 | production process:<br>.2 g of fluorine + 50 cc of transparent polyester resin + 1% of catalyst / manual grinding / moulding / hardening (light brownish grey [light yellow reflection]) / irradiated with electrons at 155,082 rad<br>(followed at «brownish grey [yellow reflection]») |
| light beige | 5528 | production process:<br>2 g of fluorine + 20 ml nitric acid / soaking: 3 d. / drying on hot plate (light beige-orange) / irradiated with gamma rays at 18.85 Mrad |
| light beige | 5529 | mineral : fluorine<br>rock : white (pinkish reflection), translucid<br>powder : white (grey reflection)<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (white [very light yellow reflection]): .2 g + 50 cc of transparent polyester resin + 1% of catalyst / manual grinding / moulding / hardening (lemon-yellow [light green tone]) / irradiated with electrons at 155,082 rad<br>(followed at «lemon-yellow [green tone]») |
| light beige | 5530 | production process:<br>(followed from «grey»)<br>1 g of fluorine + 1 cc of white transparent synthetic enamel paint used for the car / manual grinding / application on a piece of steel sheet used for the car's body measuring 1" x 1" (greyish beige) / irradiated with gamma rays at 57.4 Mrad[351,352]<br>(followed at «light brown») |
| light beige | 5531 | production process:<br>2 g of fluorine + 20 ml sulphuric acid / soaking: 3 d. / drying on hot plate (light beige [brown tone]): .2 g + 50 cc of transparent polyester resin + 1% of catalyst / manual grinding / moulding / hardening (yellow) / irradiated with electrons at 155,082 rad<br>(followed at «greenish yellow») |
| | | production process:<br>(followed from «grey a bit more accentuated and dark than "light grey"»)<br>rock irradiated with gamma rays at: |

| | | |
|---|---|---|
| light beige | 5532 | 102.4 Mrad |
| beige which becomes a bit more accentuated | 5533 | 148.4 Mrad |
| | 5534 | 201.6 Mrad |
| darkens | 5535 | 244.53 Mrad680 |
| and becomes | 5536 | 247.6 Mrad |
| still more | 5537 | 287.3 Mrad |
| accentuated | 5538 | 360 Mrad |
| while | 5539 | 425.704 Mrad |
| remaining beige | 5540 | 604.53 Mrad |
| light beige | 5541 | mineral : fluorine<br>rock : pale lilac grey, opaque<br>powder : pale grey (light lilac tone)<br>origin : Saint-Lawrence Fluorspar Company, Saint-Lawrence, Newfoundland<br><br>mineral : sulphur<br>rock : brilliant yellow<br>powder : brilliant yellow<br>origin : unknown<br><br>production process:<br>1 g of fluorine + 1 g of sulphur / 1000 °C / 1 h |
| light beige | 5542 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (very light grey-beige): .2 g + 50 cc of transparent polyester resin + 1% of catalyst / manual grinding / moulding / hardening (yellow reflection [almost colourless]) / irradiated with electrons at 155,082 rad (followed at «dark green [light yellow reflection]») |
| | | mineral : fluorine<br>rock : reddish violet, translucid<br>powder : very light grey<br>origin : Saint-Lawrence Fluorspar Company, Saint-Lawrence, Newfoundland |

| | | |
|---|---|---|
| light beige | 5543 | <u>production process:</u><br>1 g of fluorine + 1 cc of white transparent synthetic enamel paint used for the car / manual grinding / application on a piece of steel sheet used for the car's body measuring 1" x 1" (greyish cream) / irradiated with gamma[351] rays at 3.77 Mrad[352]<br>(followed at «beige») |
| light beige | 5544 | mineral : almandite<br>rock : dark brownish red<br>powder : medium brownish red<br>origin : Gore Mountain, Warren county, New York state, United States<br><br><u>production process:</u><br>(followed from «very, very light beige»)<br>4 g of almandite + 50 ml sulphuric acid / soaking: 2 wk. / separation of the liquid and the solid / drying on hot plate (colour of the liquid: very, very pale green [almost white]) / irradiated with gamma rays at 430.4 Mrad |
| light beige | 5545 | mineral : gypsum<br>rock : white (yellow reflection)<br>powder : white (yellow reflection)<br>origin : Geisborough, Nova Scotia<br><br><u>production process:</u><br>(followed from «white [yellow reflection]»)<br>rock irradiated with gamma rays at 484.704 Mrad |
| light beige | 5546 | mineral : halite[41]<br>rock : colourless<br>powder : colourless<br>origin : Seleine Mine, Iles-de-la-Madeleine, Québec<br><br>mineral : sulphur<br>rock : brilliant yellow<br>powder : brilliant yellow<br>origin : unknown<br><br><u>production process:</u><br>2 g of halite + 2 g of sulphur / 1300 °F / 1 h |
| | | mineral : hypersthene<br>rock : black<br>powder : medium brownish grey<br>origin : Lac Saint-Jean, Québec |

| | | |
|---|---|---|
| light beige | 5547 | production process:<br>2 g of hypersthene + 20 ml phosphoric acid / soaking: 2 wk. / drying on hot plate (still humid) |
| light beige | 5548 | mineral : kaolin<br>rock : chalk-white (yellow reflection)<br>powder : chalk-white (yellow reflection)<br>origin : Saint-Rémi d'Amherst, Québec<br><br>production process:<br>rock irradiated with gamma rays at 484.704 Mrad[67,433,674,681] |
| light beige | 5549 | production process:<br>(followed from «white [yellow reflection]»)<br>3 g of kaolin + 50 ml nitric acid / soaking: 2 wk. / drying on hot plate (white) / irradiated with gamma rays at 424.7 Mrad |
| light beige | 5550 | production process:<br>0↑1900 °F (white [light pink reflection]): .20 g + 50 ml hydrochloric acid / soaking: 2 wk. / drying on hot plate / irradiated with gamma rays at 64.7 Mrad<br>(followed at «medium orange-beige») |
| light beige | 5551 | mineral : microcline<br>rock : white (grey reflection)<br>powder : white (grey reflection)<br>origin : Buckingham, Québec<br><br>production process:<br>2 g of microcline + 2 g of sodium carbonate / 0↑1400 °F + 1 h at 1400 °F (white [grey reflection]) / irradiated with electrons at 302,831 rad[36] |
| light beige | 5552 | production process:<br>(followed from «very, very light beige»)<br>1300 °F / 1 h (chalk-white) / powder irradiated with gamma rays at 424.7 Mrad |
| light beige | 5553 | mineral : amazon stone<br>rock : light greenish turquoise, translucid<br>powder : white (turquoise reflection)<br>origin : unknown<br><br>production process:<br>(followed from «beige [very light pink tone]»)<br>1600 °F / 1 h (very, very light beige [very light pink tone]) / rock irradiated with gamma rays at |

1017

| | | |
|---|---|---|
| | | 424.7 Mrad |
| light beige | 5554 | production process:<br>(followed from «light mint-green»)<br>4 g of amazon + 40 ml nitric acid / soaking: 1 wk. / separation of the liquid and the solid / natural drying (colour of the liquid: medium bluish turquoise) / irradiated with gamma rays at 424.7 Mrad |
| light beige | 5555 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>2 g of molybdenite + 2 g of sodium carbonate / 0↑1500 °F + 1:30 h at 1500 °F (medium beige) / irradiated with electrons at 302,831 rad[36] |
| light beige | 5556 | mineral : olivine<br>rock : light grey, translucid<br>powder : very light grey<br>origin : Mont Albert, Gaspésie, Québec<br><br>production process:<br>0↑1800 °F (reddish orange): 1 g + 50 ml sulphuric acid / soaking: 2 wk. / drying on hot plate (white [light cream reflection]) / irradiated with gamma rays at 64.7 Mrad<br>(followed at «light milky chocolate-brown [light grey and pink tones]») |
| light beige | 5557 | production process:<br>2 g of olivine + 2 g of sodium carbonate / 0↑1000 °F + 1 h at 1000 °F<br>(followed at «brownish beige») |
| | | mineral : olivine<br>powder : colourless (green reflection)<br>origin : Mount Haven, United States<br><br>production process:<br>3 g of olivine + 20 ml hydrofluoric acid / soaking: 24 h / drying in oven at 100 °F (light cream [light orange tone]): .3 g + 50 cc of transparent polyester resin + 1% of catalyst / manual grinding / moulding / hardening (milky white) / irradiated with electrons at: |

| | | |
|---|---|---|
| light beige<br>↓<br>beige still slightly more intense | 5558<br><br>5559 | 155,082 rad[682]<br><br>305,082 rad[354] |
| light beige | 5560 | mineral : orthoclase<br>rock : light pinkish beige<br>powder : very light beige<br>origin : mine near Buckingham, Papineau county, Québec<br><br>production process:<br>.3 g of orthoclase + 50 cc of transparent polyester resin + 1% of catalyst / manual grinding / moulding / hardening (very light grey) / irradiated with electrons at 155,082 rad<br>(followed at «grey [greenish yellow reflection]») |
| light beige | 5561 | mineral : orthoclase<br>rock : white (grey reflection)<br>powder : white (grey reflection)<br>origin : mine near Buckingham, Papineau county, Québec<br><br>production process:<br>2 g of orthoclase + 20 ml hydrochloric acid / soaking: 3 d. / drying on hot plate (white [light yellow reflection]): .3 g + 50 cc of transparent polyester resin + 1% of catalyst / manual grinding / moulding / hardening (very, very light greenish grey) / irradiated with electrons at 155,082 rad<br>(followed at «greenish grey») |
| light beige | 5562 | production process:<br>.3 g of orthoclase + 50 cc of transparent polyester resin + 1% of catalyst / manual grinding / moulding / hardening (white) / irradiated with electrons at 155,082 rad<br>(followed at «very, very light greenish grey») |
| | | production process:<br>rock irradiated with gamma[67,73] rays at: |
| light beige which | 5563 | 5 Mrad |
| \| | 5564 | 10 Mrad |
| \| | 5565 | 57.4 Mrad |
| \|darkens | 5566 | 63.984 Mrad |
| \|and becomes | 5567 | 102.4 Mrad |
| \|slightly | 5568 | 148.4 Mrad |
| \|more brown | 5569 | 201.6 Mrad |
| \| | 5570 | 242.804 Mrad |

| | | |
|---|---|---|
| ⋮ ↓ much darker beige | 5571 5572 5573 | 247.6 Mrad<br>287.3 Mrad<br>360 Mrad<br>(followed at «medium beige») |
| light beige | 5574 | production process:<br>2 g of orthoclase + 20 ml nitric acid / soaking: 3 d. / drying on hot plate (white [light yellow reflection]) / irradiated with electrons at 162,431 rad<br>(followed at «light pinkish beige») |
| light beige | 5575 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>(followed at «light yellowish beige»)<br>4 g of pentlandite + 80 ml sulphuric acid / soaking: 2 wk. / drying on hot plate (light creamy yellow) / irradiated with gamma rays at 430.4 Mrad |
| light beige | 5576 | mineral : polylithionite<br>rock : transparent (beige reflection)<br>powder : transparent (beige reflection)<br>origin : De-Mix quarry, North side of Mont Saint-Hilaire, Rouville county, Québec<br><br>production process:<br>(followed from «accentuated beige reflection»)<br>rock irradiated with gamma rays at 604.53[45,228,433,571,674] Mrad |
| light beige | 5577 | mineral : polylithionite<br>rock : transparent (beige reflection)<br>powder : transparent (beige reflection)<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br>production process:<br>2 g of polylithionite + 2 g of sulphur / 1300 °F / 1 h |

| | | |
|---|---|---|
| beige a bit more pale than «light beige» | 5578 | production process:<br>2 g of polylithionite + 2 g of sulphur / 1300 °F / 1 h (light beige) / irradiated with electrons at:<br>162,431 rad |
| ↓ | | |
| beige slightly darker than «light beige» | 5579 | 302,831 rad[45] |
| light beige | 5580 | mineral : pyrophillite<br>rock : light beige (grey and pink tones), opaque<br>powder : very light beige (grey and orange-pink tones)<br>origin : Carpentier district, Abitibi, Québec<br><br>production process:<br>0↑1900 °F (light beige): .20 g + 50 ml hydrochloric acid / soaking: 4 years / drying on hot plate (still humid) / colour of the solid[30,683] |
| light beige | 5581 | production process:<br>0↑1900 °F |
| ↓ | | |
| light beige | 5582 | 0↑2000 °F |
| light beige | 5583 | mineral : quartz<br>rock : light pink, translucid<br>powder : very light grey<br>origin : unknown<br><br>production process:<br>(followed from «fairly pronounced smoky grey»)<br>4 g of quartz + 40 ml nitric acid / soaking: 7 d. / separation of the liquid and the solid / natural drying (colour of the solid: white [green reflection]) / irradiated with gamma rays at 424.7 Mrad |
| light beige | 5584 | mineral : sericite shale<br>rock : light grey (green reflection)<br>powder : very, very light grey<br>origin : Magog, Québec<br><br>production process:<br>2 g of shale + 2 g of sodium carbonate / 0↑1300 °F + 1 h at 1300 °F<br>(followed at «light yellowish beige») |

| | | |
|---|---|---|
| light beige | 5585 | production process:<br>2 g of shale + 2 g of sodium carbonate / 0↑1800 °F + 1 h at 1800 °F (Naples yellow a bit darker than «Naples yellow») / irradiated with gamma rays at 63.88 Mrad<br>(followed at «mixture of particles: white / beige / grey») |
| light beige | 5586 | mineral : serpentine<br>rock : yellowish green<br>powder : light greenish yellow<br>origin : probably Thetford Mines, Eastern Townships, Québec<br><br>production process:<br>3 g of serpentine + 25 ml nitric acid / soaking: 24 h / separation of the liquid and the solid / drying on hot plate / colour of the solid[79] |
| light beige | 5587 | production process:<br>2 g of serpentine + 2 g of sodium carbonate / 0↑1000 °F + 1 h at 1000 °F<br>(followed at «brownish beige») |
| light beige | 5588 | production process:<br>.2 g of serpentine + 50 cc of transparent polyester resin + 1% of catalyst / manual grinding / moulding / hardening (pale yellowish grey) / irradiated with electrons at 155,082 rad<br>(followed at «dark greenish yellow») |
| light beige | 5589 | mineral : sodalite<br>rock : cold light blue<br>powder : light grey (light blue tone)<br>origin : Bancroft, Ontario<br><br>production process:<br>(followed from «beige»)<br>2 g of sodalite + 2 g of sodium carbonate / 0↑1500 °F + 30 min. at 1500 °F<br>(followed at «light bluish green») |
| light beige | 5590 | mineral : steatite<br>rock : light cold grey, slightly translucid<br>powder : light grey<br>origin : East Broughton, Québec<br><br>production process:<br>powder irradiated with gamma rays at 65.704 Mrad<br>(followed at «dark greyish beige [light pinkish orange tone]») |

1022

| | | |
|---|---|---|
| light beige | 5591 | production process: (followed from «amber-brown») 0↑1600 °F (brownish grey): 2 g + 5 ml hydrochloric acid + 20 ml nitric acid / soaking: 3 d. / drying on hot plate |
| light beige | 5592 | production process: 2 g of steatite + 2 g of sodium carbonate / 0↑1500 °F + 1 h at 1500 °F (white [yellow reflection]) / irradiated with gamma rays at 64.7 Mrad (followed at «very light greyish beige») |
| light beige | 5593 | mineral : stibnite<br>rock : dark grey, silver and blue metallic brilliance<br>powder : dark grey<br>origin : Consolidated Durham Mine, Saint-Georges, New Brunswick<br><br>production process: 1 g of stibnite + 100 ml nitric acid / soaking: 2 wk. / separation of the liquid and the solid / drying on hot plate (colour of the liquid: white) / irradiated with gamma rays at 70.4 Mrad (followed at «medium milky chocolate-brown [light pink tone]») |
| light beige | 5594 | mineral : stibnite<br>rock : dark grey, with metallic brilliance<br>powder : dark grey, with metallic brilliance<br>origin : Hunan, China<br><br>production process: 5 g of stibnite + 20 ml nitric acid / soaking: 3 d. / drying on hot plate (white [light beige reflection]) / irradiated with electrons at 162,431 rad |
| light beige | 5595 | mineral : stilbite<br>rock : white (honey reflection)<br>powder : white (honey reflection)<br>origin : Lac d'amiante Mine, Black Lake, Québec<br><br>production process: 3 g of stilbite + 40 ml sulphuric acid / soaking: 16 d. / drying on hot plate (white [beige reflection]) / irradiated with gamma rays at 64.7 Mrad (followed at «medium beige») |

| | | |
|---|---|---|
| light beige | 5596 | production process:<br>(followed from «very light beige»)<br>3 g of stilbite + 40 ml sulphuric acid / soaking: 16 d. / drying on hot plate (white [beige reflection]) / irradiated with electrons at 305,200 rad[73] |
| light beige | 5597 | production process:<br>(followed from «very, very light beige»)<br>1500 °F / 1 h (chalk-white [orange reflection]) / rock irradiated with gamma rays at 424.7 Mrad |
| light beige | 5598 | production process:<br>1500 °F / 1 h (chalk-white [orange reflection]): .50 g + 40 ml hydrochloric acid / natural drying (white [very light yellow reflection]) / irradiated with gamma rays at 65.65 Mrad<br>(followed at «light chamois») |
| light beige | 5599 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>powder finely grinded and heated 0†1200 °F (Naples yellow): .50 g + 15 ml nitric acid / soaking: 2 d. / drying on hot plate (yellow [light green tone]): .2 g + 50 cc of transparent polyester resin + 1% of catalyst / manual grinding / moulding / hardening (light grey) / irradiated with electrons at 155,082 rad<br>(followed at «pale greyish green») |
| light beige | 5600 | mineral : sphalerite[31]<br>rock : honey-yellow<br>powder : pale honey-yellow<br>origin : Federal Mine, Lemieux district, Gaspésie, Québec<br><br>production process:<br>80 g of sphalerite + 100 ml nitric acid / soaking: 5 months / natural drying (very light cream, almost white): .3 g + 50 cc of transparent polyester resin + 1% of catalyst / manual grinding / moulding / hardening (cold very light grey, semimilky) / irradiated with electrons at 155,082 rad<br>(followed at «grey [greenish yellow tone]») |

1024

| | | |
|---|---|---|
| light beige | 5601 | production process:<br>80 g of sphalerite + 100 ml nitric acid / soaking: 5 months / natural drying (very light cream, almost white) / irradiated with electrons at 302,831 rad[36] |
| light beige | 5602 | production process:<br>(followed from «beige slightly darker and more accentuated than "light beige"»)<br>80 g of sphalerite + 100 ml nitric acid / soaking: 5 months / natural drying (very light cream, almost white) / irradiated with gamma rays at 424.7 Mrad |
| light beige | 5603 | mineral : tremolite<br>rock : medium brown (evergreen tone)<br>powder : greyish beige<br>origin : Tetreault Mine, Montauban, Portneuf county, Québec<br><br>mineral : zirconium silicate<br>powder : white (very light yellow reflection)<br>origin : Sial Company, Québec<br><br>production process:<br>1 g of tremolite + 1.50 g of sodium carbonate / 1600 °F / 3 h (dark grass-green): .50 g + .50 g of zirconium silicate / 1600 °F / 1 h (light grey) / irradiated with electrons at 162,431 rad |
| light beige | 5604 | production process:<br>(followed from «light grey»)<br>1 g of tremolite + 1.50 g of sodium carbonate / 1600 °F / 3 h (dark grass-green): .50 g + .50 g of zirconium silicate / 1700 °F / 1 h |
| light beige | 5605 | mineral : obsidian<br>rock : very dark smoky grey, almost black<br>powder : light grey<br>origin : Arkansas, United States<br><br>production process:<br>.3 g of obsidian + 50 cc of transparent polyester resin + 1% of catalyst / manual grinding / moulding / hardening (very light grey [light yellow reflection]) / irradiated with electrons at 155,062 rad<br>(followed at «light yellowish beige») |
| | | mineral : vesuvianite<br>rock : lilac |

1025

| | | |
|---|---|---|
| light beige | 5606 | powder : lilac<br>origin : John Mansville Mine, Asbestos, Québec<br><br>production process:<br>12 g of vesuvianite + 40 ml sulphuric acid / soaking: 10 d. / drying on hot plate (white [pink reflection]) / irradiated with electrons at 164,800 rad |
| light beige | 5607 | production process:<br>(followed from «fairly vivid light pink»)<br>0↑1600 °F<br>(followed at «beige darker than "beige"» and at «chamois») |
| light beige | 5608 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>0↑1900 °F (very light beige-grey): .50 g + 50 ml sulphuric acid / soaking: 2 wk. / drying on hot plate (white) / irradiated with gamma rays at 64.7 Mrad<br>(followed at «mixture of particles: orange-beige / beige») |
| light beige | 5609 | production process:<br>.50 g of wilsonite + .50 g of sodium carbonate (white) / irradiated with gamma rays at 614.204 Mrad[509,669] |
| light beige | 5610 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : titanium dioxide<br>powder : white<br>origin : NL Chem Canada Inc., Québec<br><br>production process:<br>2 g of wilsonite + 2 g of sodium carbonate / 0↑1600 °F + 6 h at 1600 °F (intense azure-blue): .50 g + .50 g of titanium dioxide (very, very light grey [almost white]) / irradiated with gamma rays at 614.204 Mrad[509,669] |

| | | |
|---|---|---|
| | | mineral : zincite<br>rock : mixture of areas: dark grey / orange-red<br>powder : medium milky chocolate-brown (red tone)<br>origin : Franklin, New Jersey, United States |
| light beige | 5611 | production process:<br>0↑1900 °F (black): .40 g + 50 ml sulphuric acid / soaking: 2 wk. / drying on hot plate (white [cream reflection]) / irradiated with gamma rays at 64.7 Mrad<br>(followed at «medium milky chocolate-brown [grey tone]») |
| light beige | 5612 | production process:<br>2 g of zincite + 2 g of sodium carbonate / 0↑1300 °F + 1 h at 1300 °F<br>(followed at «dark chocolate-brown») |
| | | mineral : granite gneiss<br>rock : reddish beige<br>powder : medium pink (light brown tone)<br>origin : Lac Beauport, region of the city of Québec, Québec |
| beige very lightly more accentuated than «light beige» | 5613 | production process:<br>0↑1900 °F (medium beige): 1 g + 50 ml nitric acid / soaking: 2 wk. / drying on hot plate (mixture of particles: light brown / light grey) / irradiated with gamma rays at 70.4 Mrad<br>(followed at «medium greyish beige [orange reflection]») |
| | | mineral : antigorite<br>rock : pale yellowish green<br>powder : very pale greenish yellow<br>origin : Canadian Refractories Mine, Kilmar, Québec |
| beige lightly more accentuated than «light beige» | 5614 | production process:<br>2 g of antigorite + 20 ml sulphuric acid / soaking: 3 d. / drying on hot plate (light beige) / irradiated with gamma rays at 64.7 Mrad<br>(followed at «light beige-orange») |
| | | mineral : dolomite<br>rock : white (localized yellow reflection), crystalline and translucid<br>powder : white<br>origin : Bristol district, Pontiac county, Québec |

| | | |
|---|---|---|
| beige more accentuated than «light beige» | 5615 | production process:<br>(followed from «light greyish beige [blue tone]»<br>rock irradiated with gamma rays at 425.704 Mrad<br>(followed at «light brown») |
| beige slightly more accentuated than «light beige»<br>↓<br>beige considerably more accentuated than «light beige» | 5616<br><br>5617 | mineral : pyrophillite<br>rock : light beige (grey and pink tones), opaque<br>powder : very light beige (grey and orange-pink tones)<br>origin : Carpentier district, Abitibi, Québec<br><br>production process:<br>rock irradiated with gamma rays at:<br>63.984 Mrad<br><br>127.864 Mrad<br><br>(followed at «greyish brown») |
| beige much more accentuated than «light beige» | 5618 | mineral : amazon stone<br>rock : light greenish turquoise, translucid<br>powder : white (turquoise reflection)<br>origin : unknown<br><br>production process:<br>4 g of amazon + 40 ml sulphuric acid / soaking: 22 d. / drying on hot plate (light grey) / irradiated with gamma rays at 65.65 Mrad<br>(followed at «medium beige») |
| beige a bit darker than «light beige» | 5619 | production process:<br>4 g of amazon + 40 ml sulphuric acid / soaking: 22 d. / drying on hot plate (light grey) / irradiated with electrons at 164,800 rad<br>(followed at «greyish beige a bit darker than "light greyish beige"») |
| beige a bit darker | 5620 | mineral : asbestos[4]<br>rock : dark grey (green reflection)<br>powder : light grey (green reflection)<br>origin : Asbestos Corporation Ltd., Thetford Mines, Québec<br><br>production process:<br>250 g of asbestos + 1650 ml hydrochloric acid in a |

1028

| | | |
|---|---|---|
| than «light beige» | | 2000 ml becher or asbestos entirely covered with hydrochloric acid in a vertical container / soaking: 1 wk. / drying on hot plate (formation of 3 superposed layers of colours, the one at the bottom being «apple-green»): 2 g + 2 cc of white opaque printing ink / manual grinding / 1 impression on white glazed paper (light beige) / irradiated with gamma rays at 17.91 Mrad[90,684] |
| beige a bit darker than «light beige» | 5621 | mineral : andulusite<br>rock : light brownish grey<br>powder : light grey<br>origin : Bimbowrie, South Australia<br><br>production process:<br>0↑1900 °F (light beige): 1 g + 50 ml nitric acid / soaking: 2 wk. / separation of the liquid and the solid / drying on hot plate (colour of the solid: very light yellowish beige) / irradiated with gamma rays at 70.4 Mrad<br>(followed at «medium beige») |
| beige slightly darker and accentutated than «light beige» | 5622 | mineral : sphalerite[31]<br>rock : honey-yellow<br>powder : pale honey-yellow<br>origin : Federal Mine, Lemieux district, Gaspésie, Québec<br><br>production process:<br>80 g of sphalerite + 100 ml nitric acid / soaking: 5 months / natural drying (very light cream, almost white) / irradiated with gamma rays at 64.7 Mrad<br>(followed at «light beige») |
| beige a bit darker than «light beige» | 5623 | mineral : pyrophillite<br>rock : light beige (grey and pink tones), opaque<br>powder : very light beige (grey and orange-pink tones)<br>origin : Carpentier district, Abitibi, Québec<br><br>production process:<br>0↑2000 °F (light beige) / powder irradiated with electrons at 302,831 rad[36] |
| | | mineral : analcime<br>rock : white (grey reflection), crystalline and translucid<br>powder : light grey<br>origin : De-Mix quarry, North side of Mont |

1029

| | | |
|---|---|---|
| | | Saint-Hilaire, Rouville county, Québec<br><br>production process:<br>1 g of analcime + 50 ml nitric acid / soaking: 2 wk. / drying on hot plate (light beige) / irradiated with gamma rays at 64.7 Mrad<br>(followed at «mixture of particles: light orange / white») |
| beige darker than «light beige» | 5624 | |
| | | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml nitric acid / soaking: 3 d. / drying on hot plate (white [yellow reflection]): .3 g + 50 cc of transparent polyester resin + 1% of catalyst / manual grinding / moulding / hardening (light grey [yellow reflection]) / irradiated with electrons at 155,082 rad<br>(followed at «grey [accentuated yellow reflection]») |
| beige darker than «light beige» | 5625 | |
| | | mineral : calcite<br>rock : light pink<br>powder : pinkish white<br>origin : Huddersfield district, Pontiac county, Québec<br><br>production process:<br>4 g of calcite + 20 ml nitric acid / soaking: 3 d. / drying on hot plate (orange[24]): .3 g + 50 cc of transparent polyester resin + 1% of catalyst / manual grinding / moulding / hardening (light beige [light yellow reflection]) / irradiated with electrons at 155,082 rad<br>(followed at «greyish beige [yellow reflection]») |
| beige darker than «light beige» | 5626 | |
| | | mineral : cement[62]<br>powder : medium cold grey<br>origin : Union des Carrières, Limoilou, Québec<br><br>production process:<br>2 g of cement + 2 g of sodium carbonate / 0↑1500 °F + 1 h at 1500 °F (light beige [light orange tone]) / irradiated with gamma rays at 64.7 Mrad |
| beige darker than «light beige» | 5627 | |

| | | |
|---|---|---|
| | | (followed at «mixture of particles: very light grey / very light beige / white») |
| beige darker than «light beige» | 5628 | mineral : galena<br>rock : dark grey, with metallic brilliance<br>powder : dark grey, with metallic brilliance<br>origin : Trail, British Columbia<br><br>production process:<br>20 g of galena + 100 ml nitric acid / soaking: 5 months / natural drying (light cream) / irradiated with gamma rays at 64.7 Mrad<br>(followed at «medium greyish brown [pink reflection]») |
| beige darker than «light beige» | 5629 | mineral : pyrophillite<br>rock : light beige (grey and pink tones), opaque<br>powder : very light beige (grey and orange-pink tones)<br>origin : Carpentier district, Abitibi, Québec<br><br>production process:<br>0↑2000 °F (light beige) / powder irradiated with gamma rays at 64.7 Mrad<br>(followed at «mixture of particles: beige / brown / grey») |
| beige darker than «light beige» | 5630 | mineral : vesuvianite<br>rock : lilac<br>powder : lilac<br>origin : John Mansville Mine, Asbestos, Québec<br><br>production process:<br>1600 °F / 15 h (chamois) / powder irradiated with gamma rays at 424.7 Mrad |
| beige considerably darker than «light beige» | 5631 | mineral : apatite<br>rock : pale brownish green<br>powder : very light greyish green<br>origin : Black Lake, Thetford county, Québec<br><br>mineral : sulphur<br>rock : brilliant yellow<br>powder : brilliant yellow<br>origin : unknown<br><br>production process:<br>2 g of apatite + 2 g of sulphur / 1300 °F / 1 h (light beige [very light orange tone]) / irradiated with gamma rays at 64.7 Mrad |

| | | |
|---|---|---|
| | | mineral : dolomite<br>rock : light grey<br>powder : light grey<br>origin : Shefferville, Ungava, Québec<br><br>production process:<br>0↑1000 °C (light beige) / powder irradiated with gamma rays at: |
| beige much darker than «light beige» | 5632 | 5.7 Mrad |
| ↓<br>beige more pale than «light beige» | 5633 | 365.7 Mrad |
| | | mineral : stibnite<br>rock : dark grey, silver and blue metallic brilliance<br>powder : dark grey<br>origin : Consolidated Durham Mine, Saint-Georges, New Brunswick<br><br>production process: |
| beige slightly lighter than «beige» | 5634 | 1 g of stibnite + 100 ml hydrochloric acid / soaking: 2 wk. / drying on hot plate (green) / irradiated with electrons at 162,431 rad (followed at «mixture of particles: creamy yellow / medium brownish beige») |
| | | mineral : actinolite<br>rock : cold and light evergreen<br>powder : light grey (light green tone)<br>origin : erratic block found at Saint-Philémon near Dorchester, Québec<br><br>production process: |
| beige | 5635 | 3 g of actinolite + 50 ml sulphuric acid / soaking: 2 wk. / drying on hot plate (light mint-green) / irradiated with electrons at 162,431 rad |
| | | production process: |
| beige | 5636 | 0↑1900 °F (light brown [very light orange tone]): 3 g + 80 ml sulphuric acid / soaking: 2 wk. / drying on hot plate (cold light grey) / irradiated with electrons at 162,431 rad |
| | | mineral : amazonite<br>rock : light greenish turquoise<br>powder : white (turquoise reflection)<br>origin : Lac Sairs, Témiscamingue, Québec |

| | | |
|---|---|---|
| beige | 5637 | production process:<br>2 g of amazonite + 2 g of sodium carbonate / 0↑1600 °F + 1 h at 1600 °F (light cream [very light orange tone]) / irradiated with gamma[239] rays at 64.7 Mrad<br>(followed at «mixture of particles: mostly greyish cream / white / medium beige / medium grey») |
| | | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>mineral : cement[1138]<br>powder : white<br><br>production process: |
| beige of various tones | 5638 | 1 g of asbestos + 27.40 g of cement + 13 cc of water + 1 g of potassium carbonate + 1 g of sulphur / manual grinding / moulding / hardening / 0↑1900 °F |
| ↓ | 5639 | 1 g of asbestos + 27.40 g of cement + 13 cc of water + 1 g of sulphur / manual grinding / moulding / hardening / 0↑1900 °F |
| ↓ | 5640 | 1 g of asbestos + 27.40 g of cement + 13 cc of water + 1 g of potassium carbonate / manual grinding / moulding / hardening / 0↑1900 °F |
| | | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process: |
| beige | 5641 | 0↑1900 °F (chamois [orange tone a bit more accentuated than «light orange tone»]): 50 g + 200 ml hydrochloric acid or asbestos entirely covered with hydrochloric acid / soaking: 1 wk. / drying on hot plate (vivid sunny yellow [light green |

| | | |
|---|---|---|
| | | tone]): 2 g + 2 g of sulphur / 500 °F / 1 h (followed at «chamois») |
| | | mineral : andulusite<br>rock : light brownish grey<br>powder : light grey<br>origin : Bimbowrie, South Australia<br><br>production process:<br>(followed from «light orange-beige»)<br>2 g of andulusite + 2 g of sodium carbonate: |
| beige | 5642 | 0↑1400 °F + 15 min. at 1400 °F |
| beige | 5643 | 0↑1400 °F + 30 min. at 1400 °F |
| beige | 5644 | 0↑1400 °F + 45 min. at 1400 °F<br>(followed at «greenish beige») |
| | | mineral : apatite<br>rock : pale brownish green<br>powder : very light greyish green<br>origin : Black Lake, Thetford county, Québec<br><br>production process: |
| beige | 5645 | 2 g of apatite + 25 ml nitric acid / soaking: 24 h / drying on hot plate (very light green[24]): .3 g + 50 cc of transparent polyester resin + 1% of catalyst / manual grinding / moulding / hardening (milky white [yellow reflection]) / irradiated with electrons at 305,082 rad[354] |
| | | production process: |
| beige | 5646 | powder irradiated with gamma rays at 64.7 Mrad<br>(followed at «dark beige») |
| | | mineral : asbestos[4]<br>rock : dark grey (green reflection)<br>powder : light grey (green reflection)<br>origin : Asbestos Corporation Ltd., Thetford Mines, Québec<br><br>production process: |
| beige | 5646.1 | 3 g of asbestos + 25 ml hydrochloric acid / immediate drying on hot plate (vivid orange-yellow): .3 g + 50 cc of transparent polyester resin + 10 drops of catalyst / manual grinding / moulding / deposited in an oven used for plastics at 100 °F until hardened |

| | | |
|---|---|---|
| beige | 5646.2 | <u>production process:</u><br>(followed from «apple-green» and «orange-beige»)<br>3 g of asbestos + 25 ml hydrochloric acid / soaking: 5 d. / drying in oven at 100 °F (orange-yellow): .3 g + 50 cc of transparent polyester resin + 10 drops of catalyst / manual grinding / moulding / deposited in a furnace used for plastics at 100 °F until hardened |
| beige | 5647 | mineral : apatite<br>rock : medium brownish red<br>powder : light pinkish beige<br>origin : Ile Calumet, Pontiac county, Québec<br><br><u>production process:</u><br>3 g of apatite + 25 ml hydrochloric acid / soaking: 3 d. / drying on hot plate (mixture of particles: white / brown): .2 g + 50 cc of transparent polyester resin + 1% of catalyst / manual grinding / moulding / hardening (very light brownish grey) / irradiated with electrons at 155,082 rad<br>(followed at «brownish grey») |
| beige | 5648 | <u>production process:</u><br>3 g of apatite + 25 ml nitric acid / soaking: 3 d. / drying on hot plate (very light yellow): .3 g + 50 cc of transparent polyester resin + 1% of catalyst / manual grinding / moulding / hardening (light grey [light yellow reflection]) / irradiated with electrons at 155,082 rad<br>(followed at «brownish grey [yellow reflection]») |
| beige, opaque | 5649 | <u>production process:</u><br>3 g of apatite + 20 ml phosphoric acid / soaking: 3 d. / drying on hot plate (still humid) |
| beige | 5650 | mineral : bauxite[92]<br>powder : pinkish beige, mat<br>origin : Alcan Company, French Guyana<br><br><u>production process:</u><br>(followed from «dark salmon»)<br>0↑1800 °F (pinkish chamois [tends towards «flesh»]): 3 g + 25 ml hydrochloric acid / soaking: 3 d. / drying on hot plate<br>(followed at «brownish orange») |
| beige | 5651 | <u>production process:</u><br>(followed from «greenish beige»)<br>3 g of bauxite + 10 ml hydrochloric acid + 15 ml |

| | | |
|---|---|---|
| | | nitric acid / soaking: 4-5 d. / drying on hot plate<br>(followed at «medium brown») |
| beige (with «rusty brown ochre traces») | 5652 | mineral : beryl<br>rock : light blue (near turquoise), slightly translucid<br>powder : light grey<br>origin : Lacorne district, Abitibi, Québec<br><br><u>production process:</u><br>(followed from «brown ochre [rusty tone]»)<br>1 g of beryl + 1 cc of white transparent synthetic enamel paint used for the car / manual grinding / application on a piece of steel sheet used for the car's body measuring 1" x 1" (beige-cream) / irradiated with gamma rays at 360 Mrad |
| beige | 5653 | mineral : beryl<br>rock : intense grass-green, slightly translucid<br>powder : greenish grey<br>origin : unknown<br><br><u>production process:</u><br>3 g of beryl + 40 ml sulphuric acid / soaking: 18 d. / separation of the liquid and the solid / drying on hot plate (colour of the liquid: very, very light grey, almost white [with a few «cobalt-blue» particles]) / irradiated with gamma rays at 65.65 Mrad[686] / colour of the liquid, which is at the state of a «very, very light grey» powder<br>(followed at «medium beige») |
| beige | 5654 | mineral : fluorescent calcite<br>rock : white (localized grey or brown reflection), translucid<br>powder : white (yellow reflection)<br>origin : Bancroft, Ontario<br><br><u>production process:</u><br>2 g of calcite + 2 g of sodium carbonate:<br>0↑1200 °F + 1 h at 1200 °F<br>(followed at «brownish beige [light orange-pink tone]»)<br>(followed from «mixture of particles: green / beige») |
| beige | 5655 | 0↑1800 °F + 1 h at 1800 °F |
| beige ↓ | 5656 | 0↑1900 °F + 1 h at 1900 °F |

| | | |
|---|---|---|
| beige | 5657 | production process:<br>1600 °F / 1 h (medium milky chocolate-brown [grey tone]) / irradiated with electrons at 164,800 rad |
| beige | 5658 | mineral : calcite<br>rock : light pink<br>powder : pinkish white<br>origin : Huddersfield district, Pontiac county, Québec<br><br>production process:<br>0↑1000 °C |
| beige<br>↓<br>more intense beige | 5659<br><br>5660 | production process:<br>1 g of calcite + 1 cc of white transparent synthetic enamel paint used for the car / manual grinding / application on a piece of steel sheet used for the car's body measuring 1" x 1" (cream) / irradiated with gamma rays at:<br>5 Mrad<br><br>10 Mrad<br>(followed at «orange-beige») |
| beige | 5661 | mineral : cerite<br>rock : dark brownish grey<br>powder : light grey (light brown tone)<br>origin : Jamestown, Boulder county, Colorado, United States<br><br>production process:<br>0↑1900 °F (medium brown): .60 g + 50 ml sulphuric acid / soaking: 2 wk. / drying on hot plate (white [light green reflection]) / irradiated with gamma rays at 64.7 Mrad[687]<br>(followed at «medium milky chocolate-brown [orange and grey reflections]») |
| beige | 5662 | production process:<br>0↑1900 °F (medium brown): .60 g + 50 ml sulphuric acid / soaking: 2 wk. / drying on hot plate (white [light green reflection]) / irradiated with electrons at 302,831 rad[36] |
| | | mineral : coal<br>rock : black<br>powder : brownish black<br>origin : bank of St.-Lawrence river at the city of Québec, Québec<br><br>production process:<br>(followed from «grey») |

| | | |
|---|---|---|
| beige | 5663 | 2 g of coal + 2 g of sodium carbonate / 0↑1400 °F<br>+1 h at 1400 °F<br>(followed at «light green») |
| beige | 5664 | mineral : cement[269]<br>powder : medium brownish grey<br>origin : CALCO, Charlesbourg, Québec<br><br>mineral : chrome<br>powder : light grey, with metallic brilliance<br><br>production process:<br>1.50 g of cement + .50 g of chrome / 1900 °F / 1 h<br>(cold grass-green): .25 g + 20 ml ether / natural<br>drying |
| beige | 5665 | mineral : corundum<br>rock : medium grey<br>powder : light grey<br>origin : Transvaal, Africa<br><br>production process:<br>1 g of corundum + 50 ml sulphuric acid / soaking:<br>2 wk. / drying on hot plate (very light cream) /<br>irradiated with electrons at 162,431 rad |
| beige | 5666 | mineral : dolomite<br>rock : light grey<br>powder : light grey<br>origin : Shefferville, Ungava, Québec<br><br>production process:<br>2 g of dolomite + 2 g of sodium carbonate /<br>0↑1900 °F + 1 h at 1900 °F (olive-green lighter<br>than «olive-green») / irradiated with gamma rays<br>at 63.88 Mrad<br>(followed at «medium brown [olive-green tone]») |
| beige | 5667 | mineral : dolomite<br>rock : white (localized yellow reflection),<br>crystalline and translucid<br>powder : white<br>origin : Bristol district, Pontiac county,<br>Québec<br><br>production process:<br>2 g of dolomite + 25 ml sulphuric acid / soaking:<br>24 h / drying on hot plate |
| beige | 5668 | production process:<br>2 g of dolomite + 20 ml sulphuric acid / soaking:<br>3 d. / drying on hot plate |

| | | |
|---|---|---|
| beige | 5669 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «grey more accentuated than "very light grey"»)<br>powder irradiated with gamma rays at 244.53 Mrad (followed at «medium greyish beige [light orange tone]») |
| beige | 5670 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (medium beige): .2 g + 50 cc of transparent polyester resin + 1% of catalyst / manual grinding / moulding / hardening (very light grey [light yellow reflection]) / irradiated with electrons at 155,082 rad (followed at «brownish grey [accentuated green reflection]») |
| | | production process:<br>2 g of fluorine + 2 g of sodium carbonate / |
| beige | 5671 | 0↑1200 °F + 1 h at 1200 °F |
| beige | 5672 | 0↑1300 °F + 1 h at 1300 °F |
| beige | 5673 | 0↑1400 °F + 1 h at 1400 °F |
| beige | 5674 | 0↑1500 °F + 15 min. at 1500 °F |
| beige | 5675 | 0↑1500 °F + 30 min. at 1500 °F |
| beige | 5676 | 0↑1500 °F + 45 min. at 1500 °F |
| beige | 5677 | 0↑1500 °F + 1 h at 1500 °F |
| beige ↓ | 5678 | 0↑1600 °F + 1 h at 1600 °F<br>(followed at «mixture of particles: rusty orange / grey») |
| beige | 5679 | production process:<br>2 g of fluorine + 20 ml phosphoric acid / soaking: 3 d. / drying on hot plate (still humid) |

| | | |
|---|---|---|
| beige | 5680 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>.2 g of fluorine + 50 cc of transparent polyester resin + 1% of catalyst / manual grinding / moulding / hardening (light grey [light yellow reflection]) / irradiated with electrons at 155,082 rad (followed at «grey [pronounced green reflection]») |
| beige | 5681 | mineral : fluorine<br>rock : reddish violet, translucid<br>powder : very light grey<br>origin : Saint-Lawrence Fluorspar Company, Saint-Lawrence, Newfoundland<br><br>production process:<br>(followed at «light beige»)<br>1 g of fluorine + 1 cc of white transparent synthetic enamel paint used for the car / manual grinding / application on a piece of steel sheet used for the car's body measuring 1" x 1" (greyish cream) / irradiated with gamma[351] rays at 5 Mrad[352]<br>(followed at «pinkish beige») |
| beige | 5682 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>0↑1400 °F / slow cooling in furnace (indian red[107]): 1 g + 1.50 g of feldspar (medium brown [pinkish orange tone]): .50 g + .50 g of zirconium silicate + .50 g of titanium dioxide / 1600 °F / |

1040

| | | |
|---|---|---|
| | | 1 h |
| | | mineral : honey grossular garnet<br>rock : light pinkish beige<br>powder : very light beige<br>origin : Jeffrey Mine, Asbestos (presently J.-M. Asbestos), Québec |
| | | <u>production process:</u><br>(followed from «light orange-beige»)<br>rock irradiated with gamma[67,73] rays at: |
| the rock has 2 coloured areas: beige / orange | 5683 | 57.4 Mrad<br><br>(followed at «caramel-beige [orange tone]»)<br><br>(followed from «orange-beige») |
| the rock has 2 coloured areas: beige / more pronounced orange | 5684 | 148.7 Mrad |
| beige | 5685 | 247.6 Mrad[688] |
| beige | 5686 | 287.3 Mrad[689]<br>(followed at «light orange») |
| | | mineral : sandstone<br>rock : medium pinkish brown (light violet tone)<br>powder : medium pinkish brown (light violet tone)<br>origin : at the rear of Percé, Gaspésie, Québec |
| beige | 5687 | <u>production process:</u><br>0↑1900 °F (medium rusty brown): 2 g + 50 ml sulphuric acid / soaking: 2 wk. / drying on hot plate |
| | | mineral : halite[41]<br>rock : colourless<br>powder : colourless<br>origin : Seleine Mine, Iles-de-la-Madeleine, Québec |
| beige | 5688 | <u>production process:</u><br>(followed from «light grey»)<br>2 g of halite + 2 g of sodium carbonate / 0↑1200 °F + 1 h at 1200 °F<br>(followed at «medium orange-brown») |
| | | mineral : kaolin<br>rock : chalk-white (yellow reflection)<br>powder : chalk-white (yellow reflection) |

| | | |
|---|---|---|
| beige | 5689 | origin : Saint-Rémi d'Amherst, Québec<br><br><u>production process:</u><br>3 g of kaolin + 50 ml sulphuric acid / soaking: 2 wk. / drying on hot plate (white) / irradiated with electrons at 162,431 rad<br>(followed at «pinkish beige») |
| beige | 5690 | mineral : microcline<br>rock : white (grey reflection)<br>powder : white (grey reflection)<br>origin : Buckingham, Québec<br><br><u>production process:</u><br>0↑1900 °F (light grey): .50 g + 50 ml nitric acid / soaking: 2 wk. / drying on hot plate (white [light beige reflection]) / irradiated with gamma rays at 64.7 Mrad[690]<br>(followed at «light brownish beige [grey tone]») |
| | | mineral : ochre[98]<br>powder : yellow<br>origin : small copper and nickel deposit, in the South-Western area of a mass of serpentinite at 3 km at the West of Saint-Fabien-de-Panet, Québec<br><br><u>production process:</u><br>2 g of ochre + 2 g of sodium carbonate: |
| beige | 5691 | 0↑1300 °F + 1 h at 1300 °F |
| ↓ | | |
| beige | 5692 | 0↑1400 °F + 1 h at 1400 °F<br>(followed at «medium orange-brown») |
| beige | 5693 | mineral : olivine<br>powder : colourless (green reflection)<br>origin : Mount Haven, United States<br><br><u>production process:</u><br>3 g of olivine + 20 ml ether / natural drying |
| beige | 5694 | <u>production process:</u><br>30 g of olivine + 100 ml sulphuric acid / soaking: 24 h / drying on hot plate (light cream [light orange tone]): .3 g + 50 cc of transparent polyester resin + 1% of catalyst / manual grinding / moulding / hardening (light grey [light yellow reflection]) / irradiated with electrons at 155,082 rad<br>(followed at «brownish grey [light greenish yellow reflection]») |

| | | |
|---|---|---|
| beige | 5695 | mineral : peridotite<br>rock : medium grey<br>powder : medium brownish grey (green reflection)<br>origin : Thetford Mines, Québec<br><br>production process:<br>4 g of peridotite + 100 ml sulphuric acid / soaking: 2 wk. / drying on hot plate (white [beige reflection]) / irradiated with electrons at 162,431 rad |
| beige | 5696 | production process:<br>2 g of peridotite + 2 g of sodium carbonate:<br>0↑1100 °F + 1 h at 1100 °F |
| beige ↓ | 5697 | 0↑1200 °F + 1 h at 1200 °F<br><br>(followed at «medium salmon-beige»)<br><br>(followed from «chamois») |
| beige | 5698 | 0↑1500 °F + 30 min. at 1500 °F<br>(followed at «orange-beige») |
| beige | 5699 | mineral : pyrophillite<br>rock : light grey (grey and pink tones), opaque<br>powder : very light beige (grey and orange-pink tones)<br>origin : Carpentier district, Abitibi, Québec<br><br>production process:<br>1 g of pyrophillite + 50 ml sulphuric acid / soaking: 2 wk. / drying on hot plate |
| beige | 5700 | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br>production process:<br>4 g of pyrrhotite + 80 ml phosphoric acid / soaking: 2 wk. / drying on hot plate (still humid) / colour of the solid[9] |
| beige (with a few grey particles) | 5701 | production process:<br>0↑1900 °F (dark iron-grey): 1 g + 50 ml sulphuric acid / soaking: 2 wk. / drying on hot plate |

1043

| | | |
|---|---|---|
| | | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec |
| beige | 5702 | production process:<br>20 g of quartz - mica + 100 ml hydrochloric acid / soaking: 5 months / natural drying (light apple-green) / irradiated with electrons at 162,431 rad |
| beige | 5703 | production process:<br>2 g of quartz - mica 2 g of sodium carbonate / 0↑1300 °F + 1 h at 1300 °F<br>(followed at «orange-beige») |
| | | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec |
| beige<br>↓ | 5704 | production process:<br>3 g of shale + 10 ml hydrochloric acid + 15 ml water / soaking: 3 d. / drying on hot plate |
| beige | 5705 | 3 g of shale + 5 ml hydrochloric acid + 20 ml water / soaking: 3 d. / drying on hot plate<br>(followed at «greenish beige [khaki type]») |
| | | mineral : serandite<br>rock : orange-pink or salmon (with more orange areas)<br>powder : pinkish white<br>origin : De-Mix quarry, North side of Mont Saint-Hilaire, Rouville county, Québec |
| beige | 5706 | production process:<br>2 g of serandite + 20 ml phosphoric acid / soaking: 3 d. / drying on hot plate (still humid) |
| | | mineral : sodalite<br>rock : light cold blue<br>powder : light grey (light blue tone)<br>origin : Bancroft, Ontario |

| | | |
|---|---|---|
| beige (with «very light green particles») ↓ beige | 5707<br>5708 | production process:<br>(followed at «greyish beige»)<br>2 g of sodalite + 2 g of sodium carbonate:<br>0↑1400 °F + 1 h at 1400 °F<br><br>0↑1500 °F + 15 min. at 1500 °F<br>(followed at «light beige») |
| beige | 5709 | production process:<br>0↑2000 °F |
| beige | 5710 | mineral : steatite<br>rock : light evergreen<br>powder : white<br>origin : East Broughton, Québec<br><br>production process:<br>2 g of steatite + 20 ml of a tartaric acid solution[35] / soaking: 3 d. / drying on hot plate (white [light cream reflection]) / irradiated with gamma rays at 63.88 Mrad<br>(followed at «dark greyish beige [orange tone]») |
| beige | 5711 | mineral : stibnite<br>rock : dark grey, silver and blue metallic brilliance<br>powder : dark grey<br>origin : Consolidated Durham Mine, Saint-Georges, New Brunswick<br><br>production process:<br>1 g of stibnite + 100 ml nitric acid / soaking: 2 wk. / separation of the liquid and the solid / drying on hot plate (colour of the solid: light creamy yellow) / irradiated with gamma rays at 64.7 Mrad<br>(followed at «dark orange-beige») |
| beige | 5712 | mineral : stibnite<br>rock : dark grey, with metallic brilliance<br>powder : dark grey, with metallic brilliance<br>origin : Hunan, China<br><br>production process:<br>3 g of stibnite + 25 ml nitric acid / soaking: 12 h / separation of the liquid and the solid / natural drying / colour of the liquid[691] |
| | | mineral : stilbite<br>rock : white (honey-yellow reflection)<br>powder : white (honey-yellow reflection) |

| | | |
|---|---|---|
| beige | 5713 | origin : Lac d'amiante Mine, Black Lake, Québec<br><br>production process:<br>3 g of stilbite + 40 ml nitric acid / natural drying (white [green reflection]) / irradiated with electrons at 305,200 rad[46] |
| beige | 5714 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑1200 °F + 1 h at 1200 °F (cream [light orange tone]) / irradiated with gamma rays at 64.7 Mrad (followed at «mixture of particles: dark beige / dark grey») |
| beige | 5715 | production process:<br>powder finely grinded and heated 0↑1300 °F (yellow more accentuated than «light yellow»): .2 g + 50 cc of transparent polyester resin + 1% of catalyst / manual grinding / moulding / hardening (light grey [very light yellow reflection]) / irradiated with electrons at 155,082 rad<br>(followed at «brownish grey [greenish yellow reflection] more intense dark than "light brownish grey [greenish yellow reflection]») |
| beige | 5716 | production process:<br>powder finely grinded / 0↑900 °F<br>(followed at «Naples yellow» and «light grey») |
| beige [with blue and grey watering] | 5716.1 | mineral : zinc concentrate grilled at 1000 °C ($ZnO$-$FeO$) ($SO_4$)<br>powder : reddish brown<br>origin : Zinc Electrolytic du Canada Co., Montréal, Québec<br><br>production process:<br>1 g of concentrate + 5 g of pyrex / manual grinding / heated: 5 °C per min. 0↑1245 °C + maintenance during 1 h / cooling: 5 °C per min. until ambient temperature is reached / the entity is done in ambient air |
| beige very lightly | 5716.2 | production process:<br>1 g of concentrate + 5 g of pyrex / manual grinding |

| | | |
|---|---|---|
| more accentuated than «beige» [blue and grey watering a bit more accentuated] | | / heated: 5 °C per min. 0↑1245 °C + maintenance during 1 h / cooling: 5 °C per min. until ambient temperature is reached / the entity is done in ambient air (beige [with blue and grey watering]) / irradiated with gamma rays at 9.88 Mrad |
| beige | 5717 | mineral : vesuvianite<br>rock : lilac<br>powder : lilac<br>origin : John Mansville Mine, Asbestos, Québec<br><br>production process:<br>12 g of vesuvianite + 40 ml hydrochloric acid / soaking: 10 d. / drying on hot plate (white [pink reflection]) / irradiated with gamma rays at 65.65 Mrad<br>(followed at «dark greyish beige») |
| beige | 5718 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>1 g of yofortierite + 50 ml hydrochloric acid / soaking: 2 wk. / drying on hot plate |
| beige | 5719 | mineral : sodium carbonate<br>powder : white<br><br>production process:<br>1900 °F / 1 h (very light pinkish beige) / irradiated with gamma[239] rays at 64.7 Mrad<br>(followed at «beige a bit darker than "very light beige"») |
| beige a bit darker than «beige» | 5720 | mineral : andulusite<br>rock : light brownish grey<br>powder : light grey<br>origin : Bimbowrie, South Australia<br><br>production process:<br>(followed from «light brownish beige»)<br>2 g of andulusite + 2 g of sodium carbonate / 0↑1400 °F + 1 h at 1400 °F (beige [light green tonel) / irradiated with gamma rays at 423.88 Mrad |

1047

| | | |
|---|---|---|
| beige darker than «beige» | 5721 | mineral : stibnite<br>rock : dark grey, silver and blue metallic brilliance<br>powder : dark grey<br>origin : Consolidated Durham Mine, Saint-Georges, New Brunswick<br><br>production process:<br>1 g of stibnite + 100 ml hydrochloric acid / soaking: 2 wk. / drying on hot plate (green) / irradiated with gamma rays at 70.4 Mrad<br>(followed at «dark and intense greyish brown») |
| beige darker than «beige» | 5722 | mineral : vesuvianite<br>rock : lilac<br>powder : lilac<br>origin : John Mansville Mine, Asbestos, Québec<br><br>production process:<br>(followed from «chamois» and «light beige»)<br>0↑1700 °F<br>(followed at «dark beige») |
| beige darker than «beige»<br>↓<br>beige still darker | 5723<br><br><br>5724 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «light beige [pink reflection]»)<br>powder irradiated with gamma rays at:<br>287.3 Mrad<br><br>360 Mrad<br>(followed at «medium beige») |
| beige [between «light beige» and | 5725 | mineral : tremolite<br>rock : medium brown (evergreen tone)<br>powder : greyish beige<br>origin : Tetreault Mine, Montauban, Portneuf county, Québec<br><br>mineral : zirconium silicate<br>powder : white (very light yellow reflection)<br>origin : Sial Company, Québec<br><br>production process:<br>(followed from «brownish grey»)<br>1 g of tremolite + 1.50 g of sodium carbonate / 1600 °F / 3 h (dark grass-green): .50 g + .50 g of |

| | | |
|---|---|---|
| «medium beige»] | | zirconium silicate / 1600 °F / 1 h (light grey) / irradiated with gamma rays at 614.204 Mrad |
| beige lighter and more luminous than «medium beige» | 5726 | mineral : bauxite[92]<br>powder : pinkish beige, mat<br>origin : Alcan Company, French Guyana<br><br><u>production process:</u><br>3 g of bauxite + 25 ml sulphuric acid / soaking: 24 h / drying on hot plate (medium brownish grey) / irradiated with gamma rays at 64.7 Mrad (followed at «greyish beige lighter than "medium greyish beige"») |
| medium beige | 5726.1 | mineral : orpiment<br>rock : vivid yellow (orange tone)<br>powder : vivid yellow (orange tone)<br>origin : Nevada, United States<br><br><u>production process:</u><br>1 g of orpiment + 5 g of pyrex / manual grinding / heated: 5 °C per min. 0↑1245 °C + maintenance during 1 h / cooling: 5 °C per min. until ambient temperature is reached / the entity is done in ambient air (milky white) / irradiated with gamma rays at 4.94 Mrad<br>(followed at «milky burnt umber [between "medium" and "dark" burnt umber]») |
| medium beige | 5727 | mineral : tiger-eye agate<br>rock : orange, with silky luster, opaque<br>powder : orange, with silky luster<br>origin : Africa<br><br><u>production process:</u><br>(followed from «grey a bit darker than "light grey"»)<br>3 g of agate + 40 ml sulphuric acid / soaking: 18 d. / drying on hot plate (light grey) / irradiated with gamma rays at 425.65 Mrad |
| | | mineral : andulusite<br>rock : light brownish grey<br>powder : light grey<br>origin : Bimbowrie, South Australia<br><br><u>production process:</u><br>(followed from «beige a bit darker than "light beige"») |

1049

| | | |
|---|---|---|
| medium beige | 5728 | 0↑1900 °F (light beige): 1 g + 50 ml nitric acid / soaking: 2 wk. / separation of the liquid and the solid / drying on hot plate (colour of the solid: very light yellowish beige) / irradiated with gamma rays at 430.4 Mrad |
| medium beige | 5729 | production process:<br>4 g of andalusite + 80 ml nitric acid / soaking: 2 wk. / drying on hot plate (medium khaki-beige) / irradiated with electrons at 162,431 rad |
| medium beige | 5730 | mineral : beryl<br>rock : intense grass-green, slightly translucid<br>powder : greenish grey<br>origin : unknown<br><br>production process:<br>3 g of beryl + 40 ml hydrochloric acid / soaking: 1 wk. / separation of the liquid and the solid / natural drying (colour of the solid: pale apple-green) / irradiated with gamma rays at 424.7 Mrad |
| medium beige | 5731 | production process:<br>(followed from «beige»)<br>3 g of beryl + 40 ml sulphuric acid / soaking: 18 d. / separation of the liquid and the solid / drying on hot plate (colour of the liquid: very, very light grey, almost white [with a few «cobalt-blue» particles]) / irradiated with gamma rays at 425.65 Mrad[692] |
| medium beige | 5732 | mineral : fluorescent calcite<br>rock : white (localized grey or brown reflection), translucid<br>powder : white (yellow reflection)<br>origin : Bancroft, Ontario<br><br>production process:<br>(followed from «brownish beige [pink tone]»)<br>2 g of calcite + 2 g of sodium carbonate / 0↑1300 °F + 1 h at 1300 °F (brownish beige [light orange-pink tone], between «light» and «medium» brownish beige [orange-pink tone]) / irradiated with gamma rays at 424.7 Mrad |
| medium beige | 5733 | production process:<br>(followed from «light beige»)<br>2 g of calcite + 2.50 g of sodium carbonate / 1700 °F / 1 h (emerald-green) / irradiated with |

| | | |
|---|---|---|
| | | gamma rays at 424.7 Mrad |
| medium beige | 5734 | <u>production process:</u><br>(followed from «milky chocolate-brown [grey tone]»)<br>1600 °F / 1 h (medium milky chocolate-brown [grey tone]) / rock irradiated with gamma rays at 424.7 Mrad |
| medium beige | 5735 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>(followed from «very, very light beige»)<br>4 g of calcite + 40 ml sulphuric acid / soaking: 14 d. / drying on hot plate (white) / irradiated with gamma rays at 425.65 Mrad |
| medium beige | 5736 | mineral : cryolite<br>rock : white, crystalline and translucid<br>powder : white<br>origin : Ivigtut, Groenland<br><br><u>production process:</u><br>(followed from «white [beige reflection]»)<br>0↑1600 °F (white [with yellowish areas]): .20 g + 50 ml nitric acid / soaking: 2 wk. / drying on hot plate (white [light yellow reflection]) / irradiated with gamma rays at 424.7 Mrad |
| medium beige | 5737 | mineral : dolomite<br>rock : white (localized yellow reflection), crystalline and translucid<br>powder : white<br>origin : Bristol district, Pontiac county, Québec<br><br><u>production process:</u><br>(followed from «light beige»)<br>2 g of dolomite + 20 ml hydrofluoric acid / soaking: 24 h / drying in oven at 100 °F (white [yellow reflection]) / irradiated with gamma rays at 424.7 Mrad |
| medium beige | 5738 | <u>production process:</u><br>(followed from «brownish beige [light orange tone]»)<br>2 g of dolomite + 2 g of sodium carbonate / 0↑1500 °F + 1 h at 1500 °F (orange) / irradiated |

| | | |
|---|---|---|
| | | with gamma rays at 424.7 Mrad |
| medium beige | 5739 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate |
| medium beige | 5740 | mineral : granite gneiss<br>rock : reddish beige<br>powder : medium pink (light brown tone)<br>origin : Lac Beauport, region of the city of Québec, Québec<br><br>production process:<br>0↑1900 °F<br>(followed at «medium beige [light pink reflection]») |
| medium cold beige | 5741 | mineral : haematite<br>rock : medium chocolate-brown<br>powder : medium chocolate-brown<br>origin : Nouveau Québec, Québec<br><br>production process:<br>(followed from «very, very light cream [orange tone]»)<br>4 g of haematite + 100 ml sulphuric acid / soaking: 2 wk. / drying on hot plate (very, very light cream, almost white [light orange tone]) / irradiated with gamma rays at 424.7 Mrad |
| medium beige | 5742 | mineral : labrador<br>rock : blackish grey<br>powder : medium grey<br>origin : Lac Saint-Jean, Québec<br><br>production process:<br>2 g of labrador + 2 g of sodium carbonate / 0↑1000 °F + 1 h at 1000 °F (dark pinkish beige) / irradiated with gamma rays at 423.88 Mrad[262] |
| medium beige | 5743 | mineral : labradorite<br>rock : bluish green<br>powder : light grey (light green tone)<br>origin : Chicoutimi county, Québec<br><br>production process:<br>(followed from «white [beige reflection]»)<br>2 g of labradorite + 20 ml hydrofluoric acid / |

1052

| | | |
|---|---|---|
| | | soaking: 24 h / drying in oven at 100 °F (white [very, very light yellow reflection]) / irradiated with gamma rays at 424.7 Mrad |
| medium beige | 5744 | mineral : amazon stone<br>rock : light greenish turquoise, translucid<br>powder : white (turquoise reflection)<br>origin : unknown<br><br>production process:<br>(followed from «beige more accentuated than "light beige"»)<br>4 g of amazon + 40 ml sulphuric acid / soaking: 22 d. / drying on hot plate (light grey) / irradiated with gamma rays at 425.65 Mrad |
| medium beige<br>↓<br>medium beige | 5745<br><br>5746 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «light pinkish beige [grey tone]»)<br>2 g of molybdenite + 2 g of sodium carbonate:<br>0↑1500 °F<br><br>0↑1500 °F + 1:30 h at 1500 °F<br>(followed at «olive-green») |
| medium beige | 5747 | mineral : orthoclase<br>rock : white (grey reflection)<br>powder : white (grey reflection)<br>origin : mine near Buckingham, Papineau county, Québec<br><br>production process:<br>(followed from «light beige»)<br>rock irradiated with gamma[67,73] rays at 602.804 Mrad |
| medium beige | 5748 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>rock irradiated with electrons at 305,200 rad[46] |

1053

| | | |
|---|---|---|
| medium beige | 5749 | mineral : serpentine<br>rock : yellowish green<br>powder : light greenish yellow<br>origin : probably Thetford Mines, Eastern Townships, Québec<br><br>production process:<br>(followed from «light and accentuated pinkish beige»)<br>3 g of serpentine + 25 ml nitric acid / soaking: 24 h / drying on hot plate (light beige) / irradiated with gamma[239] rays at 424.7 Mrad |
| medium beige | 5750 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>(followed from «very light beige»)<br>powder irradiated with gamma rays at 550.22 Mrad |
| medium beige | 5751 | mineral : steatite<br>rock : light evergreen<br>powder : white<br>origin : East Broughton, Québec<br><br>production process:<br>(followed from «very, very light beige or grey [light green reflection]»)<br>powder irradiated with gamma rays at 424.7 Mrad[674] |
| cold medium beige<br>↓ | 5752 | production process:<br>2200 °F / 1 h (light orange-brown) / powder irradiated with gamma rays at:<br>64.7 Mrad[693] |
| cold beige a bit more pale | 5753 | 424.7 Mrad[694] |
| medium beige | 5754 | production process:<br>(followed from «very, very light yellow»)<br>2 g of steatite + 20 ml hydrofluoric acid / soaking: 24 h / drying in oven at 100 °F (white) / irradiated with gamma rays at 423.88 Mrad |

1054

| | | |
|---|---|---|
| | | mineral : stilbite<br>rock : white (honey-yellow reflection)<br>powder : white (honey-yellow reflection)<br>origin : Lac d'amiante Mine, Black Lake, Québec<br><br>production process:<br>(followed from «light beige»)<br>3 g of stilbite + 40 ml sulphuric acid / soaking: 16 d. / drying on hot plate (white [beige reflection]) / irradiated with gamma rays at: |
| medium beige | 5755 | 65.65 Mrad |
| ↓ | | |
| medium beige | 5756 | 425.65 Mrad |
| | | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><br>production process:<br>1 g of vesuvianite + 1 g of sulphur / 1700 °F / 1 h (grey) / irradiated with electrons at: |
| medium beige | 5757 | 164,800 rad |
| ↓ | | |
| beige a bit darker | 5758 | 305,200 rad[73] |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «beige darker than "beige"») |
| medium beige | 5759 | powder irradiated with gamma rays at 615.924 Mrad |
| | | mineral : calcite (with clayey inclusions)<br>rock : very light creamy yellow, translucid<br>powder : white<br>origin : De-Mix quarry, near Saint-Philippe de Laprairie, Québec |

| | | |
|---|---|---|
| beige lightly more accentuated than «medium beige» | 5760 | production process:<br>1600 °F / 1 h (medium beige [pinkish orange tone]) / rock irradiated with gamma rays at 64.7 Mrad (followed at «creamy yellow») |
| beige a bit more pronounced than «medium beige» | 5761 | production process:<br>1600 °F / 1 h (medium beige [pinkish orange tone]) / rock irradiated with electrons at 305,200 rad[46] |
| beige a bit darker than «medium beige» | 5762 | mineral : calcite<br>rock : light pink<br>powder : pinkish white<br>origin : Huddersfield district, Pontiac county, Québec<br><br>production process:<br>1 g of calcite + 1 cc of white transparent printing ink / mechanical grinding / 11 superimpositions on white glazed paper (medium beige) / irradiated with gamma rays at 5.7 Mrad[649] |
| beige much darker than «medium beige» | 5763 | mineral : corundum<br>rock : medium grey<br>powder : light grey<br>origin : Transvaal, Africa<br><br>production process:<br>2 g of corundum + 20 ml hydrofluoric acid / soaking: 24 h / drying in oven at 100 °F (mixture of particles: beige / orange-brown) / irradiated with gamma rays at 64.7 Mrad<br>(followed at «medium milky chocolate-brown») |
| beige much darker than «medium beige» | 5764<br><br><br><br><br><br>5765 | mineral : corundum<br>rock : rusty yellow<br>powder : light grey<br>origin : Mount Eagle, Ontario<br><br>production process:<br>2 g of corundum + 25 ml sulphuric acid / soaking: 24 h / drying on hot plate (medium beige [light grey tone]) / irradiated with gamma rays at 64.7 Mrad<br>(followed at «medium milky chocolate-brown») |
| | | mineral : siderite<br>rock : caramel-brown (grey tone)<br>powder : light beige (orange tone)<br>origin : De-Mix quarry, North side of Mont Saint-Hilaire, Rouville county, Québec |

1056

| | | |
|---|---|---|
| beige a bit lighter and more luminous than «dark beige» | 5766 | <u>production process:</u><br>1 g of siderite + 1 cc of white opaque synthetic enamel paint used for the car / manual grinding / application on a piece of steel sheet used for the car's body measuring 1" x 1" (dark creamy beige) / irradiated with gamma rays at 5 Mrad<br>(followed at «light beige [orange-pink tone]») |
| beige a bit more pale than «dark beige» | 5767 | mineral : tremolite<br>rock : medium brown (evergreen tone)<br>powder : greyish beige<br>origin : Tetreault Mine, Montauban, Portneuf county, Québec<br><br><u>production process:</u><br>0↑2000 °F (dark orange-beige) / powder irradiated with electrons at 302,831 rad[36] |
| beige lighter than «dark beige» | 5768 | mineral : labrador<br>rock : blackish grey<br>powder : medium grey<br>origin : Lac Saint-Jean, Québec<br><br><u>production process:</u><br>(followed from «dark pinkish beige»)<br>2 g of labrador + 2 g of sodium carbonate / 0↑1200 °F + 1 h at 1200 °F<br>(followed at «dark rusty orange [red tone]») |
| dark beige | 5769 | mineral : crocidolite<br>rock : dark greyish blue<br>powder : pale greyish blue<br>origin : Griqualand district, South Africa<br><br><u>production process:</u><br>(followed from «orange-beige a bit more pale than "light orange-beige"»)<br>2 g of crocidolite + 2 g of sodium carbonate / 0↑1100 °F + 1 h at 1100 °F (light orange-beige) / irradiated with gamma[239] rays at 550.22 Mrad |
| dark beige | 5770 | mineral : andulusite<br>rock : light brownish grey<br>powder : light grey<br>origin : Bimbowrie, South Australia<br><br><u>production process:</u><br>(followed from «orange-beige»)<br>4 g of andulusite + 80 ml nitric acid / soaking: 2 wk. / drying on hot plate (medium khaki-beige) / irradiated with gamma rays at 430.4 Mrad |

1057

| | | |
|---|---|---|
| dark beige | 5771 | mineral : anorthosite<br>rock : dark grey<br>powder : medium grey<br>origin : Jonquière, Lac Saint-Jean, Québec<br><br>production process:<br>(followed from «brownish grey darker than "medium brownish grey"»)<br>powder irradiated with gamma rays at 550.22 Mrad[695] |
| dark beige | 5772 | mineral : apatite<br>rock : pale brownish green<br>powder : very light greyish green<br>origin : Black Lake, Thetford county, Québec<br><br>production process:<br>(followed from «beige»)<br>powder irradiated with gamma rays at 424.7 Mrad[696] |
| dark beige | 5773 | mineral : bauxite[92]<br>powder : pinkish beige, mat<br>origin : Alcan Company, French Guyana<br><br>production process:<br>(followed from «medium orange-beige»)<br>2 g of bauxite + 2 g of sodium carbonate / 0↑1400 °F + 1 h at 1400 °F (yellow ochre darker than "yellow ochre"») / irradiated with gamma rays at 424.7 Mrad |
| dark beige | 5774 | mineral : chalcopyrite<br>rock : brass-yellow, with metallic luster<br>powder : dark grey (with golden particles)<br>origin : Mines Noranda, Noranda, Abitibi, Québec<br><br>production process:<br>(followed from «intense mint-green»)<br>5 g of chalcopyrite + 20 ml sulphuric acid / soaking: 3 d. / drying on hot plate (light mint-green) / irradiated with gamma rays at 424.7 Mrad |
| dark beige | 5775 | mineral : zirconium oxide<br>powder : beige<br>origin : Tam Ceramic Inc., Québec<br><br>production process:<br>irradiated with electrons at 302,831 |

| | | |
|---|---|---|
| | | rad[36] |
| dark beige | 5776 | mineral : stilbite<br>rock : white (honey-yellow reflection)<br>powder : white (honey-yellow reflection)<br>origin : Lac d'amiante Mine, Black Lake, Québec<br><br><u>production process:</u><br>(followed from «medium pinkish beige»)<br>1500 °F / 1 h (chalk-white [orange reflection]): .50 g + 40 ml nitric acid / natural drying (white [light yellow reflection]) / irradiated with gamma rays at 425.65 Mrad |
| dark beige | 5777 | mineral : vesuvianite<br>rock : lilac<br>powder : lilac<br>origin : John Mansville Mine, Asbestos, Québec<br><br><u>production process:</u><br>(followed from «beige darker than "beige"»)<br>1700 °F / 1 h |
| dark beige | 5778 | mineral : chalcocite<br>rock : dark iron-grey (with localized turquoise oxidation)<br>powder : dark iron-grey<br>origin : Butte, Montana, United States<br><br><u>production process:</u><br>3 g of chalcocite + 20 ml of a cyanide solution[255] / natural drying (colour of the liquid: apple-green) / irradiated with gamma rays at 424.7 Mrad[701] |
| mixture of particles | | |
| very light beige / very light green<br>↓ | 5779 | mineral : blue lace agate<br>rock : light blue (violet tone), slightly translucid<br>powder : very light grey<br>origin : Africa<br><br><u>production process:</u><br>3 g of agate + 40 ml hydrochloric acid / soaking: 1 wk. / separation of the liquid and the solid / natural drying (colour of the liquid: light and vivid apple-green) / irradiated with electrons at: 164,800 rad |

1059

| | | |
|---|---|---|
| very light beige / very light green | 5780 | 305,200 rad[73] |
| very light beige / light grey | 5781 | mineral : fluorescent calcite<br>rock : white (localized grey or brown reflection), translucid<br>powder : white (yellow reflection)<br>origin : Bancroft, Ontario<br><br>production process:<br>(followed from «grey [very light pink tone]»)<br>2 g of calcite + 2 g of sodium carbonate / 0↑1500 °F + 45 min. at 1500 °F (white [green reflection]) / irradiated with gamma rays at 424.7 Mrad |
| very light beige / very light grey / white | 5782 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>2 g of molybdenite + 2 g of sodium carbonate / 0↑1500 °F + 1:30 h at 1500 °F (medium beige) / irradiated with gamma rays at 424.7 Mrad[81] |
| very light beige / very light green | 5783 | mineral : peridotite<br>rock : medium grey<br>powder : medium brownish grey (green reflection)<br>origin : Thetford Mines, Québec<br><br>production process:<br>4 g of peridotite + 100 ml sulphuric acid / soaking: 2 wk. / drying on hot plate (white [beige reflection]) / irradiated with gamma rays at 70.4 Mrad<br>(followed at «dark greyish beige [light orange-pink tone]») |
| beige / white / grey ranging from «very light grey» to «light grey» | 5784 | mineral : calcite<br>rock : light pink<br>powder : pinkish white<br>origin : Huddersfield district, Pontiac county, Québec<br><br>production process:<br>1 g of calcite + 1 g of sodium carbonate / 1700 °F / 1 h (green) / irradiated with electrons at 305,200 rad[46] |
| | | mineral : antigorite |

1060

| | | |
|---|---|---|
| light beige / light grey / white | 5785 | rock : pale yellowish green<br>powder : very pale greenish yellow<br>origin : Canadian Refractories Mine, Kilmar, Québec<br><br>production process:<br>(followed from «light cream [light green tone]»)<br>2 g of antigorite + 2 g of sodium carbonate / 0↑1700 °F + 1 h at 1700 °F (light mint-green) / irradiated with gamma rays at 423.88 Mrad |
| light beige / white | 5786 | mineral : biotite gneiss<br>rock : blackish grey, golden vitreous brilliance<br>powder : dark grey<br>origin : Grenville geological province, Québec<br><br>production process:<br>12 g of gneiss + 40 ml sulphuric acid / soaking: 22 d. / drying on hot plate |
| light beige / medium rusty orange | 5787 | mineral : graphite<br>rock : dark grey, with metallic brilliance<br>powder : dark grey, with metallic brilliance<br>origin : Grenville, Québec<br><br>production process:<br>(followed from «brown»)<br>1 g of graphite + 1 g of sodium carbonate / 1800 °F / 1 h (intense emerald-green) / irradiated with gamma rays at 424.7 Mrad |
| light beige / light iron-grey / white | 5788 | mineral : gypsum<br>rock : white (yellow reflection)<br>powder : white (yellow reflection)<br>origin : Beisborough, Nova Scotia<br><br>production process:<br>(followed from «grey»)<br>2 g of gypsum + 2 g of sodium carbonate / 0↑1900 °F + 1 h at 1900 °F (chalk-white) / irradiated with gamma rays at 424.7 Mrad |
| | | mineral : hornblende<br>rock : medium evergreen (light grey tone), with a vitreous brilliance<br>powder : medium cold grey (light green tone)<br>origin : Abitibi, Québec<br><br>production process:<br>(followed from «white [yellow reflection]») |

| | | |
|---|---|---|
| light beige / white / dark chocolate-brown / medium milky chocolate-brown | 5789 | 3 g of hornblende + 20 ml hydrofluoric acid / soaking: 24 h / drying in oven at 100 °F (white) / irradiated with gamma rays at 424.7 Mrad |
| light beige / white | 5790 | mineral : microcline<br>rock : white (grey reflection)<br>powder : white (grey reflection)<br>origin : Buckingham, Québec<br><br>production process:<br>(followed from «beige [bluish grey or greenisn grey tone]»)<br>2 g of microcline + 2 g of sodium carbonate / 0↑1400 °F + 1 h at 1400 °F (white [grey reflection]) / irradiated with gamma rays at 423.88 Mrad |
| light beige / white (localized very light green reflection) | 5791 | mineral : amazon stone<br>rock : light greenish turquoise clair, translucid<br>powder : white (turquoise reflection)<br>origin : unknown<br><br>production process:<br>4 g of amazon stone + 40 ml nitric acid / soaking: 1 wk. / separation of the liquid and the solid / natural drying (colour of the solid: white [light blue reflection]) / irradiated with electrons at 305,200 rad[46,698] |
| light beige /light milky chocolate-brown / dark iron-grey | 5792 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>0↑2000 °F (mixture of particles: brown / white [yellow reflection]) / irradiated with electrons at 302,831 rad[36] |
| light beige /light grey / white | 5793 | mineral : sericite shale<br>rock : light grey (green reflection)<br>powder : very, very light grey<br>origin : Magog, Québec<br><br>production process:<br>(followed from «light beige»)<br>2 g of shale + 2 g of sodium carbonate / 0↑1800 °F + 1 h at 1800 °F (Naples yellow a bit darker than «Naples yellow») / irradiated with |

| | | |
|---|---|---|
| | | gamma rays at 423.88 Mrad |
| light beige / medium beige | 5794 | mineral : stibnite<br>rock : dark grey, with metallic brilliance<br>powder : dark grey, with metallic brilliance<br>origin : Hunan, China<br><br>production process:<br>(followed from «white [beige reflection]»)<br>5 g of stibnite + 20 ml nitric acid / soaking: 3 d. / drying on hot plate (white [light beige reflection]) / irradiated with gamma rays at 424.7 Mrad |
| light beige / medium beige / light grey / light greenish grey / white | 5795 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «greyish beige»)<br>3 g of wilsonite + 80 ml sulphuric acid / soaking: 2 wk. / drying on hot plate (white [light localized lilac reflection]) / irradiated with gamma rays at 424.7 Mrad |
| light beige / greyish brown more pale than «medium greyish brown» | 5796 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br>production process:<br>(followed from «mixture of particles: beige / white»)<br>0↑1600 °F (light milky chocolate-brown): .20 g + 50 ml sulphuric acid / soaking: 2 wk. / drying on hot plate (mixture of particles: dark beige / medium greyish brown) / irradiated with gamma[239] rays at 424.7 Mrad |
| | | mineral : zincite<br>rock : mixture of areas: dark grey / red (orange tone)<br>powder : medium milky chocolate-brown (red tone)<br>origin : Franklin, New Jersey, United States<br>production process:<br>(followed from «brown») |

| | | |
|---|---|---|
| beige ranging from «light beige» to «dark beige» | 5797 | 2 g of zincite + 2 g of sodium carbonate / 0↑1600 °F + 1 h at 1600 °F (very dark and intense emerald-green [blue tone]) / irradiated with gamma rays at 423.88 Mrad |
| | | mineral : epidote<br>rock : green (light brown tone [olive-green type])<br>powder : grey (greenish brown tone)<br>origin : Deloro Road, Madoc, Ontario<br><br><u>production process:</u><br>0↑1700 °F (the rock has 2 areas: light beige / orange-brown) / rock irradiated with gamma[228] rays at: |
| beige a bit darker than «light beige» / orange-brown a bit darker than «orange-brown»<br>↓ | 5798 | 64.7 Mrad |
| beige more pale than «light beige» / orange-brown more pale than «orange-brown» | 5799 | 424.7 Mrad |
| beige more pale than «beige» / pale beige-grey (pink reflection) | 5800 | mineral : vesuvianite<br>rock : lilac<br>powder : lilac<br>origin : John Mansville Mine, Asbestos, Québec<br><br><u>production process:</u><br>0↑1700 °F (beige darker than «beige») / powder irradiated with electrons at 305,200 rad[46] |
| beige / brown | 5801 | mineral : blue lace agate<br>rock : light blue (violet tone), slightly translucid<br>powder : very light grey<br>origin : Africa<br><br><u>production process:</u><br>(followed from «light beige»)<br>3 g of agate + 40 ml hydrochloric acid / soaking: 1 wk. / separation of the liquid and the solid / natural drying (colour of the liquid: light and vivid apple-green) / irradiated with gamma rays at 424.7 Mrad |

1064

| | | |
|---|---|---|
| beige / brown | 5802 | <u>production process:</u><br>(followed from «light orange»)<br>3 g of agate + 40 ml hydrochloric acid / soaking: 1 wk. / separation of the liquid and the solid / natural drying (colour of the solid: white) / irradiated with gamma rays at 424.7 Mrad |
| beige / brown | 5803 | mineral : Gaspé agate<br>rock : marbled nodule with shaded tints of white, pink and light grey, slightly translucid<br>powder : very light pinkish grey<br>origin : Mont Lyall, Gaspésie, Québec<br><br><u>production process:</u><br>(followed from «light beige»)<br>4 g of agate + 40 ml nitric acid / soaking: 1 wk. / separation of the liquid and the solid / natural drying (colour of the solid: white) / irradiated with gamma rays at 424.7 Mrad |
| beige / brown | 5804 | <u>production process:</u><br>(followed from «olive-green»)<br>4 g of agate + 40 ml nitric acid / soaking: 1 wk. / separation of the liquid and the solid / natural drying (colour of the liquid: fairly vivid greenish turquoise [with a few «olive-green» particles]) / irradiated with gamma rays at 424.7 Mrad |
| beige of various tones | 5805 | mineral : agate<br>rock : grey (with a light orange circular area on the surface), slightly translucid<br>powder : very light grey<br>origin : unknown<br><br><u>production process:</u><br>(followed from «mixture of particles: smoky grey / orange [brown tone]»)<br>3 g of agate + 40 ml nitric acid / soaking: 1 wk. / separation of the liquid and the solid / natural drying (colour of the solid: white [green reflection]) / irradiated with gamma rays at 424.7 Mrad |
| beige / brown | 5806 | <u>production process:</u><br>(followed from «olive-green [yellow tone]»)<br>3 g of agate + 40 ml hydrochloric acid / soaking: 1 wk. / separation of the liquid and the solid / natural drying (colour of the solid: white) / irradiated with gamma rays at 424.7 Mrad |

| | | |
|---|---|---|
| beige / brown | 5807 | <u>production process:</u><br>(followed from «light phtalo[217a]-green»)<br>3 g of agate + 40 ml nitric acid / soaking: 1 wk. / separation of the liquid and the solid / natural drying (colour of the liquid: medium greenish turquoise) / irradiated with gamma rays at 424.7 Mrad |
| beige / green | 5808 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]): .50 g + .50 g of sodium carbonate / 0↑1400 °F<br>(followed at «green») |
| beige / brown | 5809 | mineral : chalcocite<br>rock : dark iron-grey (with localized turquoise oxidation)<br>powder : dark iron-grey<br>origin : Butte, Montana, United States<br><br><u>production process:</u><br>(followed from «dark chocolate-brown»)<br>2 g of chalcocite + 2 g of sodium carbonate:<br>0↑1600 °F + 1 h at 1600 °F |
| ↓ | | |
| beige / brown | 5810 | 0↑1700 °F + 1 h at 1700 °F |
| ↓ | | |
| beige / brown | 5811 | 0↑1800 °F + 1 h at 1800 °F<br>(followed at «mixture of particles: orange / brown») |
| beige / brown [with metallic copper particles] | 5812 | <u>production process:</u><br>2 g of chalcocite + 2 g of sodium carbonate / 1900 °F / 1 h |
| | | <u>production process:</u><br>2 g of chalcocite + 2 g of sodium carbonate / 1900 °F / 1 h (mixture of particles: beige / brown [with metalized copper particles]) / irradiated with electrons at: |

| | | |
|---|---|---|
| beige a bit darker than «beige» / brown a bit darker than «brown» ↓ beige a bit darker than «beige» / brown a bit darker than «brown» | 5813<br>5814 | 162,431 rad<br>302,831 rad[45] |
| beige / orange-brown | 5815 | mineral : corundum<br>rock : medium grey<br>powder : light grey<br>origin : Transvaal, Africa<br><br>production process:<br>2 g of corundum + 20 ml hydrofluoric acid / soaking: 24 h / drying in oven at 100 °F |
| beige / black | 5816 | mineral : granite gneiss<br>rock : reddish beige<br>powder : medium pink (light brown tone)<br>origin : Lac Beauport, region of the city of Québec, Québec<br><br>production process:<br>0↑1900 °F (medium beige): 1 g + 80 ml phosphoric acid / soaking: 2 wk. / drying on hot plate (still humid) / colour of the solid[9] |
| beige / dark grey | 5817<br>5818 | mineral : ilmenite<br>rock : blackish grey, with metallic luster<br>powder : blackish grey, with metallic luster<br>origin : Québec Fer et Titane Company, Havre Saint-Pierre, Québec<br><br>production process:<br>3 g of ilmenite + 20 ml sulphuric acid / soaking: 3 d. / drying on hot plate |
| beige / white / light grey | 5819 | mineral : microcline<br>rock : white (grey reflection)<br>powder : white (grey reflection)<br>origin : Buckingham, Québec<br><br>production process:<br>(followed from «light brown»)<br>2 g of microcline + 2 g of sodium carbonate / 0↑1500 °F + 1 h at 1500 °F (light bluish green) / irradiated with gamma rays at 423.88 Mrad |

| | | |
|---|---|---|
| beige / brown / orange-beige | 5820 | mineral : amazon stone<br>rock : light greenish turquoise clair, translucid<br>powder : white (turquoise reflection)<br>origin : unknown<br><br>production process:<br>(followed from «beige-green more pale than "medium beige-green"»)<br>4 g of microcline + 40 ml hydrochloric acid / soaking: 1 wk. / separation of the liquid and the solid / natural drying (colour of the liquid: medium apple-green) / irradiated with gamma rays at 424.7 Mrad |
| beige / brown | 5821 | mineral : pyrophillite<br>rock : light beige (grey and pink tones), opaque<br>powder : very light beige (grey and orange-pink tones)<br>origin : Carpentier district, Abitibi, Québec<br><br>production process:<br>0†1900 °F (light beige): .20 g + 50 ml nitric acid / soaking: 2 wk. / drying on hot plate |
| beige of various tones | 5822 | mineral : quartz<br>rock : light pink, translucid<br>powder : very light grey<br>origin : unknown<br><br>production process:<br>(followed from «greenish beige»)<br>4 g of quartz + 40 ml nitric acid / soaking: 1 wk. / separation of the liquid and the solid / natural drying (colour of the liquid: light green) / irradiated with gamma[67] rays at 424.7 Mrad |
| beige / brown | 5823 | production process:<br>(followed from «light greenish brown»)<br>4 g of quartz + 40 ml hydrochloric acid / soaking: 7 d. / separation of the liquid and the solid / natural drying (colour of the liquid: green) / irradiated with gamma rays at 424.7 Mrad |
| | | mineral : sphalerite[27]<br>rock : dark grey, golden yellow metallic brilliance<br>powder : dark brownish grey<br>origin : Matagami Mine, Matagami, Québec |

| | | |
|---|---|---|
| beige / brown darker than «brown» | 5824 | production process:<br>0↑1800 °F (medium chocolate-brown): 1 g + 50 ml nitric acid / soaking: 2 wk. / drying on hot plate (mixture of particles: brown / white) / irradiated with electrons at 162.431 rad |
| beige / white | 5825 | mineral : steatite<br>rock : light evergreen<br>powder : white<br>origin : East Broughton, Québec<br><br>production process:<br>0↑2200 °F (light brown): 2 g + 50 ml sulphuric acid / soaking: 2 wk. / drying on hot plate |
| beige / brown | 5826 | mineral : stibnite<br>rock : dark grey, with metallic brilliance<br>powder : dark grey, with metallic brilliance<br>origin : Hunan, China<br><br>production process:<br>0↑1900 °F |
| beige / white | 5827 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>0↑1600 °F (light milky chocolate-brown): .20 g + 50 ml sulphuric acid / soaking: 2 wk. / drying on hot plate (mixture of particles: dark beige / medium greyish brown) / irradiated with gamma[239] rays at 64.7 Mrad<br>(followed at «mixture of particles: light beige / greyish brown») |
| medium beige / pale beige | 5828 | mineral : Gaspé agate<br>rock : marbled nodule with shaded tints of white, pink and light grey, slightly translucid<br>powder : very light pinkish grey<br>origin : Mont Lyall, Gaspésie, Québec<br><br>production process:<br>4 g of agate + 40 ml hydrochloric acid / soaking: 1 wk. / separation of the liquid and the solid / natural drying (colour of the solid: pale beige |

1069

| | | |
|---|---|---|
| | | [with «pale apple-green» particles]) / irradiated with electrons at 305,200 rad[46] |
| medium beige / medium iron-grey | 5829 | mineral : labrador<br>rock : blackish grey<br>powder : medium grey<br>origin : Lac Saint-Jean, Québec<br><br>production process:<br>(followed from «mossy chocolate-brown»)<br>2 g of labrador + 2 g of sodium carbonate / 0↑1600 °F + 30 min. at 1600 °F (light olive-green) / irradiated with gamma rays at 424.7 Mrad |
| medium beige / medium grey / white | 5830 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>2 g of molybdenite + 2 g of sodium carbonate / 0↑1300 °F + 1 h at 1300 °F (light pinkish beige [grey tone]) / irradiated with gamma rays at 424.7 Mrad[81] |
| medium beige / brown / grey | 5831 | mineral : pyrophillite<br>rock : light beige (grey and pink tones), opaque<br>powder : very light beige (grey and orange-pink tones)<br>origin : Carpentier district, Abitibi, Québec<br><br>production process:<br>(followed from «beige darker than "light beige"»)<br>0↑2000 °F (light beige) / powder irradiated with gamma rays at 424.7 Mrad |
| dark beige / brownish red / brownish pink | 5832 | mineral : almandite<br>rock : dark brownish red<br>powder : medium brownish red<br>origin : Gore Mountain, Warren county, New York state, United States<br><br>production process:<br>(followed from «grey a bit darker than "grey"»)<br>4 g of almandite + 50 ml sulphuric acid / soaking: 2 wk. / separation of the liquid and the solid / drying on hot plate (colour of the solid: grey) / irradiated with gamma rays at 430.4 Mrad |

1070

| | | |
|---|---|---|
| dark beige / pink / dark chocolate-brown / medium chocolate-brown | 5833 | mineral : Gaspé agate<br>rock : marbled nodule with shaded tints of white, pink and light grey, slightly translucid<br>powder : very light pinkish grey<br>origin : Mont Lyall, Gaspésie, Québec<br><br>production process:<br>(followed from «light brown»)<br>4 g of agate + 40 ml hydrochloric acid / soaking: 1 wk. / separation of the liquid and the solid / natural drying (colour of the solid: pale beige [with «pale apple-green» particles]) / irradiated with gamma rays at 424.7 Mrad |
| dark beige / dark brown | 5834 | mineral : agate<br>rock : grey (with a light orange circular area on the surface), slightly translucid<br>powder : very light grey<br>origin : unknown<br><br>production process:<br>(followed from «olive-green [yellow tone]»)<br>3 g of agate + 40 ml hydrochloric acid / soaking: 1 wk. / separation of the liquid and the solid / natural drying (colour of the liquid: green) / irradiated with gamma rays at 424.7 Mrad |
| dark beige / dark greyish brown / dark iron-grey / dark chocolate-brown | 5835 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>2 g of analcime + 2 g of sodium carbonate / 0↑1500 °F + 1 h at 1500 °F (light bluish green) / irradiated with gamma rays at 424.7 Mrad[81] |
| dark beige /medium yellowish cream | 5836 | mineral : kaolin<br>rock : chalk-white (yellow reflection)<br>powder : chalk-white (yellow reflection)<br>origin : Saint-Rémi d'Amherst, Québec<br><br>production process:<br>3 g of kaolin + 50 ml hydrochloric acid / soaking: 2 wk. / drying on hot plate (light lemon-yellow) / irradiated with gamma rays at 424.7 Mrad[81] |

| | | |
|---|---|---|
| dark beige / dark iron-grey / dark greyish beige | 5837 | mineral : labrador<br>rock : blackish grey<br>powder : medium grey<br>origin : Lac Saint-Jean, Québec<br><br><u>production process</u>:<br>(followed from «mossy chocolate-brown [orange-pink or pinkish orange tone]»)<br>2 g of labrador + 2 g of sodium carbonate / 0↑1700 °F + 1 h at 1700 °F (olive-green [yellow tone]) / irradiated with gamma rays at 424.7 Mrad |
| dark beige / dark grey | 5838 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process</u>:<br>(followed from «beige»)<br>2 g of molybdenite + 2 g of sodium carbonate / 0↑1200 °F + 1 h at 1200 °F (cream [light orange tone]) / irradiated with gamma rays at 424.7 Mrad |
| dark beige /medium greyish brown | 5839 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br><u>production process</u>:<br>0↑1600 °F (light milky chocolate-brown): .20 g + 50 ml sulphuric acid / soaking: 2 wk. / drying on hot plate |
| beige ochre | | |
| light beige ochre | 5840 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><u>production process</u>:<br>(followed from «pinkish lilac a bit darker than "light pinkish lilac"»)<br>1 g of ochre + 2 g of titanium dioxide / 0↑1750 °F |

| greyish beige | | |
|---|---|---|
| pale greyish beige | 5841 | mineral : anorthosite<br>rock : dark grey<br>powder : medium grey<br>origin : Jonquière, Lac Saint-Jean, Québec<br><br>production process:<br>2 g of anorthosite + 2 g of sodium carbonate / 0↑1700 °F + 1 h at 1700 °F (olive-green) / irradiated with gamma rays at 64.7 Mrad |
| pale greyish beige | 5842 | mineral : cement[82]<br>powder : medium cold grey<br>origin : Union des Carrières, Limoilou, Québec<br><br>mineral : chrome<br>powder : light grey, with metallic brilliance<br>production process:<br>(followed from «brownish grey»)<br>1.50 g of cement + .50 g of chrome / grinded together and humidified with water until it reaches the consistency of a paste / 1300 °F / 1 h (followed at «very light beige [light green tone]») |
| very, very light beige (light grey tone) [almost white] | 5843 | mineral : microcline<br>rock : white (grey reflection)<br>powder : white (grey reflection)<br>origin : Buckingham, Québec<br><br>mineral : sulphur<br>rock : brilliant yellow<br>powder : brilliant yellow<br>origin : unknown<br>production process:<br>2 g of microcline + 2 g of sulphur / 1300 °F / 1 h |
| very, very light greyish beige or very, very light beige-grey | 5844 | mineral : anorthosite<br>rock : light grey<br>powder : very light greyish beige<br>origin : rang Sainte-Germaine, Oka, Québec<br><br>mineral : cement[1138]<br>powder : white<br>production process:<br>1 g of anorthosite + 27.40 g of cement + 13 cc of water / manual grinding / moulding / hardening / 0↑1900 °F |

| | | |
|---|---|---|
| very, very light greyish beige | 5845 | mineral : barite<br>rock : pinkish white<br><br>powder : white<br>origin : Niobec Mine, Saint-Honoré, Saguenay, Québec<br><br><u>production process:</u><br>2 g of barite + 2 g of sodium carbonate / 0↑1700 °F + 1 h at 1700 °F (very light cream) / irradiated with electrons at 302,831 rad[36] |
| very, very light greyish beige or very, very light beige-grey | 5846 | mineral : calcite[11]<br>powder : white<br>origin : Calcite du Nord Company, Saint-Eugène de Mistassini, Lac Saint-Jean, Québec<br><br><u>production process:</u><br>8 g of calcite + 50 cc of transparent polyester resin + 1% of catalyst / manual grinding / moulding / hardening (white [beige or grey reflection]) / irradiated with gamma rays at 5.7 Mrad |
| very, very light greyish beige | 5847 | mineral : halite[41]<br>rock : colourless<br>powder : colourless<br>origin : Seleine Mine, Iles-de-la-Madeleine, Québec<br><br><u>production process:</u><br>2 g of halite + 2 g of sodium carbonate / 0↑1100 °F + 1 h at 1100 °F (light grey) / irradiated with electrons at 302,831 rad[45] |
| very, very light greyish beige | 5848 | mineral : quartz<br>rock : light pink, translucid<br>powder : very light grey<br>origin : unknown<br><br><u>production process:</u><br>1600 °F / 1 h (white, semiopaque) / rock irradiated with electrons at 305,200 rad[46] |
| greyish beige | 5849 | mineral : beryl<br>rock : light blue, slightly translucid<br>powder : light grey<br>origin : Abitibi, Québec<br><br><u>production process:</u><br>(followed from «beige more intense than "very, very light beige"»)<br>2 g of beryl + 2 g of sodium carbonate / |

| | | |
|---|---|---|
| darker than «very, very light greyish beige» | | 0↑1800 °F + 1 h at 1800 °F (very light beige) / irradiated with gamma rays at 424.7 Mrad |
| beige (light grey tone) much more intense and dark than «very, very light greyish beige» | 5850 | mineral : anorthosite<br>rock : light grey<br>powder : very light greyish beige<br>origin : rang Sainte-Germaine, Oka, Québec<br><br>production process:<br>powder irradiated with gamma rays at 64.7 Mrad<br><br>(followed at «medium orange-beige») |
| greyish beige more pale than «very light greyish beige» | 5851 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>0↑2000 °F (very light beige-grey) / powder irradiated with electrons at 302,831 rad[36] |
| very light greyish beige | 5852 | mineral : andulusite<br>rock : light brownish grey<br>powder : light grey<br>origin : Bimbowrie, South Australia<br><br>mineral : cement[1138]<br>powder : white<br><br>production process:<br>1 g of andulusite + 1 g of potassium carbonate + 27.40 g of cement + 13 cc of water / manual grinding / moulding / hardening / 0↑1900 °F |
| very light beige (very light grey tone) | 5853 | mineral : antigorite<br>rock : pale yellowish green<br>powder : very pale greenish yellow<br>origin : Canadian Refractories Mine, Kilmar, Québec<br><br>production process:<br>powder irradiated with electrons at 302,831 rad[36] |

1075

| | | |
|---|---|---|
| very light greyish beige | 5854 | mineral : apatite<br>rock : reddish brown<br>powder : light pinkish beige<br>origin : Calumet, Pontiac county, Québec<br><br>mineral : sulphur<br>rock : brilliant yellow<br>powder : brilliant yellow<br>origin : unknown<br><br>production process:<br>2 g of apatite + 2 g of sulphur / 1300 °F / 1 h |
| very light greyish beige | 5855 | mineral : apatite<br>rock : medium brownish red<br>powder : light pinkish beige<br>origin : Ile Calumet, Pontiac county, Québec<br><br>production process:<br>2 g of apatite + 2 g of sodium carbonate / 0↑1900 °F + 1 h at 1900 °F (mixture of particles: light green / beige) / irradiated with gamma rays at 64.7 Mrad<br>(followed at «medium beige-grey») |
| very light greyish beige | 5856 | mineral : beryl<br>rock : light blue, slightly translucid<br>powder : light grey<br>origin : Abitibi, Québec<br><br>production process:<br>2 g of beryl + 25 ml sulphuric acid / soaking: 24 h / drying on hot plate |
| very light greyish beige | 5857 | mineral : calcite[11]<br>powder : white<br>origin : Calcite du Nord Company, Saint-Eugène de Mistassini, Lac Saint-Jean, Québec<br><br>production process:<br>2 g of calcite + 2 g of sodium carbonate / 0↑1900 °F + 1 h at 1900 °F (white) / irradiated with gamma rays at 424.7 Mrad[e1] |
| | | mineral : fluorine<br>rock : violet and white, translucid<br>powder : very light grey<br>origin : Saint-Lawrence Fluorspar Company, Saint-Lawrence, Newfoundland |

| | | |
|---|---|---|
| very light greyish beige or very light beige-grey | 5858 | <u>production process:</u><br>2 g of fluorine + 20 ml hydrochloric acid / soaking: 3 d. / drying on hot plate (milky white [pink reflection]): .2 g + 50 cc of transparent polyester resin + 1% of catalyst / manual grinding / moulding / hardening (very, very light greenish grey) / irradiated with electrons at 155,082 rad (followed at «brownish green [amber tone]») |
| very light greyish beige | 5859 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>2 g of fluorine + 20 ml hydrochloric acid / soaking: 3 d. / drying on hot plate |
| very light greyish beige or very light beige-grey | 5860 | mineral : hornblende<br>rock : medium evergreen (light grey tone), with a vitreous brilliance<br>powder : medium cold grey (light green tone)<br>origin : Abitibi, Québec<br><br><u>production process:</u><br>3 g of hornblende + 20 ml hydrofluoric acid / soaking: 24 h / drying in oven at 100 °F (white): .2 g + 50 cc of transparent polyester resin + 1% of catalyst / manual grinding / moulding / hardening (very light grey) / irradiated with electrons at 155,082 rad<br>(followed at «greenish grey [light brown reflection]») |
| very light greyish beige | 5861 | mineral : microcline<br>rock : white (grey reflection)<br>powder : white (grey reflection)<br>origin : Buckingham, Québec<br><br><u>production process:</u><br>0↑1900 °F (light grey): .50 g + 50 ml sulphuric acid / soaking: 2 wk. / drying on hot plate (white [light beige reflection]) / irradiated with electrons at 302,831 rad[36] |
| | | mineral : peridotite<br>rock : medium grey<br>powder : medium brownish grey (green reflection)<br>origin : Thetford Mines, Québec |

| | | |
|---|---|---|
| very light greyish beige | 5862 | <u>production process:</u><br>0↑1900 °F (orange-brown): .20 g + 50 ml sulphuric acid / soaking: 2 wk. / drying on hot plate |
| very light greyish beige | 5863 | mineral : pyrophillite<br>rock : light beige (grey and pink tones), opaque<br>powder : very light beige (grey and orange-pink tones)<br>origin : Carpentier district, Abitibi, Québec<br><br><u>production process:</u><br>0↑1900 °F (light beige): .20 g + 50 ml sulphuric acid / soaking: 2 wk. / drying on hot plate (medium beige [very light grey tone]) / irradiated with electrons at 302,831 rad[36] |
| very light greyish beige | 5864 | mineral : crystalline quartz<br>rock : colourless<br>powder : colourless<br>origin : Adam Farm, Bonsecours, Eastern Townships, Québec<br><br><u>production process:</u><br>(followed from «very, very light grey»)<br>1600 °F / 1 h (white, semiopaque) / powder irradiated with gamma rays at 424.7 Mrad[67,73] |
| very light greyish beige or very light beige-grey | 5865 | mineral : serpentine<br>rock : yellowish green<br>powder : light greenish yellow<br>origin : probably Thetford Mines, Eastern Townships, Québec<br><br><u>production process:</u><br>3 g of serpentine + 20 ml hydrofluoric acid / soaking: 24 h / drying in oven at 100 °F (very, very light yellowish beige): .3 g + 50 cc of transparent polyester resin + 1% of catalyst / manual grinding / moulding (very light cold grey) / irradiated with electrons at 155,082 rad<br>(followed at «grey [light green reflection] more intense than "very light greenish grey"») |
| | | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the |

| | | |
|---|---|---|
| very light greyish beige | 5866 | North of Saint-Urbain, Québec<br><br><u>production process</u>:<br>(followed from «very, very light beige»)<br>2 g of silica + 2 g of sodium carbonate / 0↑1500 °F + 15 min. at 1500 °F (very, very light cream [almost white]) / irradiated with electrons at 302,831 rad[45] |
| very light beige (light grey reflection) | 5867 | mineral : steatite<br>rock : cold light grey, slightly translucid<br>powder : light grey<br>origin : East Broughton, Québec<br><br><u>production process</u>:<br>(followed from «light beige»)<br>2 g of steatite + 2 g of sodium carbonate / 0↑1500 °F + 1 h at 1500 °F (white [yellow reflection]) / irradiated with gamma rays at 424.7 Mrad |
| very light greyish beige | 5868 | mineral : tremolite<br>rock : medium brown (evergreen tone)<br>powder : greyish beige<br>origin : Tetreault Mine, Montauban, Portneuf county, Québec<br><br>mineral : calcite[11]<br>powder : white<br>origin : Calcite du Nord Company, Saint-Eugène de Mistassini, Lac Saint-Jean, Québec<br><br><u>production process</u>:<br>2 g of tremolite + 2 g of calcite / 1500 °F / 1 h |
| greyish beige a bit darker than «very light greyish beige» | 5869 | mineral : peridotite<br>rock : medium grey<br>powder : medium brownish grey (green reflection)<br>origin : Thetford Mines, Québec<br><br><u>production process</u>:<br>0↑1900 °F (orange-brown): .20 g + 50 ml sulphuric acid / soaking: 2 wk. / drying on hot plate (very light greyish beige) / irradiated with electrons at 162,431 rad |
| | | mineral : sphalerite[31]<br>rock : honey-yellow<br>powder : pale honey-yellow<br>origin : Federal Mine, Lemieux district, Gaspésie, Québec |

1079

| | | |
|---|---|---|
| greyish beige a bit darker than «very light greyish beige» | 5870 | <u>production process:</u><br>4 g of sphalerite + 20 ml hydrofluoric acid / soaking: 24 h / drying in oven at 100 °F (medium greyish brown): .3 g + 50 cc of transparent polyester resin + 1% of catalyst / manual grinding / moulding / hardening (very light greyish beige [yellow reflection]) / irradiated with electrons at 155,082 rad<br>(followed at «greyish beige [green reflection]») |
| greyish beige darker than «very, very light greyish beige» | 5871 | mineral : orthoclase<br>rock : light pinkish beige<br>powder : very light beige<br>origin : mine near Buckingham, Papineau county, Québec<br><br><u>production process:</u><br>powder irradiated with gamma rays at 64.7 Mrad[702]<br>(followed at «medium greyish beige [light orange tone]» and at «light pink») |
| greyish beige much darker than «very light greyish beige» | 5872 | mineral : peridotite<br>rock : medium grey<br>powder : medium brownish grey (green reflection)<br>origin : Thetford Mines, Québec<br><br><u>production process:</u><br>0↑1900 °F (orange brown): .20 g + 50 ml sulphuric acid / soaking: 2 wk. / drying on hot plate (very light greyish beige) / irradiated with gamma rays at 64.7 Mrad<br>(followed at «dark greyish beige [orange tone]») |
| greyish beige much lighter and grey than «light greyish beige» | 5873 | mineral : corundum<br>rock : medium grey<br>powder : light grey<br>origin : Transvaal, Africa<br><br><u>production process:</u><br>powder irradiated with gamma rays at 64.7 Mrad[703]<br><br>(followed at «medium greyish beige») |
| | | mineral : halite[41]<br>rock : colourless<br>powder : colourless<br>origin : Seleine Mine, Iles-de-la-Madeleine, Québec |

| | | |
|---|---|---|
| beige (light grey tone) much lighter than «light greyish beige» | 5874 | production process:<br>2 g of halite + 20 ml sulphuric acid / soaking: 3 d. / drying on hot plate (light beige [light grey tone]) / irradiated with gamma rays at 18.85 Mrad |
| light greyish beige or light beige-grey | 5875 | mineral : amazonite<br>rock : greenish turquoise<br>powder : white (turquoise reflection)<br>origin : Lac Saint-Jean, Québec<br><br>production process:<br>.2 g of amazonite + 50 cc of transparent polyester resin + 1% of catalyst / manual grinding / moulding / hardening (very, very light greenish yellow) / irradiated with electrons at 155,082 rad (followed at «yellow [light green reflection]») |
| light greyish beige | 5876 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br>production process:<br>.50 g of asbestos + .50 g of titanium dioxide / 1600 °F / 1 h |
| dark beige (grey tone) | 5877 | mineral : anorthosite<br>rock : dark grey<br>powder : medium grey<br>origin : Jonquière, Lac Saint-Jean, Québec<br>production process:<br>2 g of anorthosite + 2 g of sodium carbonate / 0↑1300 °F + 1 h at 1300 °F<br>(followed at «light chamois») |
| light greyish beige | 5878 | production process:<br>(followed from «pale greenish beige»)<br>0↑1900 °F (medium brown): .30 g + 50 ml sulphuric acid / soaking: 2 wk. / separation of the liquid and the solid / drying on hot plate (colour of the solid: medium brownish grey) / irradiated with electrons at 302,831 rad[45] |
| | | mineral : apatite<br>rock : reddish brown<br>powder : light pinkish beige<br>origin : Calumet, Pontiac county, Québec |

1081

| | | |
|---|---|---|
| light greyish beige | 5879 | production process:<br>1000 °C / 1 h |
| light greyish beige | 5880 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>production process:<br>(followed from «beige darker than "very light beige"»)<br>2 g of apatite + 2 g of sodium carbonate / 0↑1800 °F + 1 h at 1800 °F (very light beige) / irradiated with gamma rays at 424.7 Mrad |
| light greyish beige | 5881 | mineral : apophyllite<br>rock : milky white, translucid<br>powder : white<br>origin : Gaspé Copper Mine, Gaspé, Québec<br><br>production process:<br>(followed from «beige [yellow or green reflection]»)<br>0↑1800 °F (light grey): .20 g + 50 ml sulphuric acid / soaking: 2 wk. / drying on hot plate (white [light green reflection]) / irradiated with gamma rays at 424.7 Mrad |
| light greyish beige | 5882 | mineral : calcite[11]<br>powder : white<br>origin : Calcite du Nord Company, Saint-Eugène de Mistassini, Lac Saint-Jean, Québec<br><br>production process:<br>4 g of calcite + 20 ml hydrofluoric acid / soaking: 24 h / drying in oven at 100 °F (white [light yellow reflection]): .3 g + 50 cc of transparent polyester resin + 1% of catalyst / manual grinding / moulding / hardening (light grey [yellow reflection]) / irradiated with electrons at 155,082 rad<br>(followed at «grey [greenish yellow reflection]») |
| | | mineral : fluorescent calcite<br>rock : white (localized grey or brown reflection), translucid |

| | | |
|---|---|---|
| light greyish beige or light beige-grey | 5883 | powder : white (yellow reflection)<br>origin : Bancroft, Ontario<br><br>production process:<br>.3 g of calcite + 50 cc of transparent polyester resin + 1% of catalyst / manual grinding / moulding / hardening (very light grey [light yellow reflection]) / irradiated with electrons at 155,082 rad<br>(followed at «yellowish green») |
| light greyish beige | 5884 | mineral : cerite<br>rock : dark brownish grey<br>powder : light grey (light brown tone)<br>origin : Jamestown, Boulder county, Colorado, United States<br><br>production process:<br>(followed from «white [yellow reflection]»)<br>4 g of cerite + 100 ml sulphuric acid / soaking: 2 wk. / drying on hot plate (white) / irradiated with gamma rays at 424.7 Mrad |
| light greyish beige | 5885 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «brownish grey more light than "medium brownish grey"»)<br>1.50 g of cement + .50 g of chrome / grinded and humidified with water until it reaches the consistency of a paste / 1300 °F / 1 h |
| light greyish beige | 5886 | production process:<br>(followed from «grey [light green tone]»)<br>1.50 g of cement + .25 g of chrome / 1350 °F / 1 h<br>(followed at «greenish grey») |
| light greyish beige | 5887 | mineral : dolomite<br>rock : light grey<br>powder : light grey<br>origin : Shefferville, Ungava, Québec<br><br>production process:<br>(followed from «grey [light brown tone]»)<br>rock irradiated with gamma rays at:<br>148.4 Mrad |

1083

| | | |
|---|---|---|
| greyish beige darker than «light greyish beige» | 5888 | 201.6 Mrad |
| ↓ | | |
| greyish beige still more brown and dark than «light greyish beige» | 5889 | 247.6 Mrad<br>(followed at «greyish brown») |
| | | mineral : feldspar<br>rock : white, opaque<br>powder : white<br>origin : Baraute, Abitibi, Québec<br><br>production process:<br>rock irradiated with gamma rays at: |
| beige tone | 5890 | 5 Mrad |
| \| | 5891 | 10 Mrad |
| \| | 5892 | 57.4 Mrad |
| \| which | 5893 | 65.704 Mrad |
| \| evolves | 5894 | 102.4 Mrad |
| \| towards | 5895 | 148.4 Mrad |
| \| the | 5896 | 201.6 Mrad |
| \| | 5897 | 244.53 Mrad |
| \| | 5898 | 247.6 Mrad |
| \| | 5899 | 287.3 Mrad |
| \| | 5900 | 360 Mrad |
| ↓ | 5901 | 425.704 Mrad |
| light greyish beige | 5902 | 604.53 Mrad[704] |
| | | mineral : fluorine<br>rock : violet and white, translucid<br>powder : very light grey<br>origin : Saint-Lawrence Fluorspar Company, Saint-Lawrence, Newfoundland<br><br>mineral : sulphur<br>rock : brilliant yellow<br>powder : brilliant yellow<br>origin : unknown<br><br>production process: |
| light greyish beige | 5903 | 2 g of fluorine + 2 g of sulphur / 1300 °F / 1 h |
| | | mineral : fluorine<br>rock : very light yellow, translucid<br>powder : white (light yellow reflection)<br>origin : Saint-Lawrence Fluorspar Company, Saint-Lawrence, Newfoundland<br><br>production process: |
| light greyish beige | 5904 | 2 g of fluorine + 20 ml sulphuric acid / soaking: |

| | | |
|---|---|---|
| | | 3 d. / drying on hot plate |
| light greyish beige | 5905 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>.2 g of fluorine + 50 cc of transparent polyester resin + 1% of catalyst / manual grinding / moulding / hardening (greenish grey) / irradiated with electrons at 155,082 rad<br>(followed at «greyish green [yellow reflection]») |
| light greyish beige | 5906 | mineral : fluorine<br>rock : very pale yellow, translucid<br>origin : Ohio, United States<br><br>production process:<br>rock irradiated with a UV laser beam during 3 min. on a 0.25 cm² surface with a laser energy of 0.210 Joules having a flux of 2.8 x $10^7$ x W / cm² which gives a total energy of 756 Joules[705]<br>(followed at «greyish beige») |
| light greyish beige | 5907 | mineral : granite gneiss<br>rock : reddish beige<br>powder : medium pink (light brown tone)<br>origin : Lac Beauport, region of the city of Québec, Québec<br><br>production process:<br>0↑1900 °F (medium beige): 1 g + 50 ml sulphuric acid / soaking: 2 wk. / drying on hot plate |
| light beige (light grey tone) | 5908 | mineral : halite[41]<br>rock : colourless<br>powder : colourless<br>origin : Seleine Mine, Iles-de-la-Madeleine, Québec<br><br>production process:<br>2 g of halite + 20 ml sulphuric acid / soaking: 3 d. / drying on hot plate |
| | | mineral : halite[41]<br>rock : colourless<br>powder : colourless<br>origin : Seleine Mine, Iles-de-la-Madeleine, Québec |

| | | |
|---|---|---|
| light beige (very light grey tone) | 5909 | mineral : sulphur<br>rock : brilliant yellow<br>powder : brilliant yellow<br>origin : unknown<br><br>production process:<br>2 g of halite + 2 g of sulphur / 1300 °F / 1 h (light beige) / irradiated with electrons at 302,831 rad[36] |
| light greyish beige or light beige-grey | 5910 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 20 ml phosphoric acid / soaking: 3 d. / drying on hot plate [still humid] / (very light grey): .3 g + 50 cc of transparent polyester resin + 1% of catalyst / manual grinding / moulding / hardening (very light grey) / irradiated with electrons at 155,082 rad<br>(followed at «grey [greenish yellow tone]») |
| light greyish beige or light beige-grey | 5911 | production process:<br>3 g of hornblende + 25 ml nitric acid / soaking: 24 h / drying on hot plate (medium greyish evergreen [light yellow tone]): .2 g + 50 cc of transparent polyester resin + 1% of catalyst / manual grinding / moulding / hardening (very light cold grey [light green reflection]) / irradiated with electrons at 155,082 rad<br>(followed at «yellowish green [grey reflection]») |
| light greyish beige | 5912 | mineral : labrador<br>rock : blackish grey<br>powder : medium grey<br>origin : Lac Saint-Jean, Québec<br><br>production process:<br>1000 °C / 1 h (medium greyish beige) / powder irradiated with gamma rays at 64.7 Mrad<br>(followed at «dark greyish beige») |
| | | mineral : mica<br>rock : golden brown, with vitreous luster, translucid<br>powder : light amber, with vitreous luster, translucid (sheet)<br>origin : Lac Vert mountain, region of Low, |

1086

| | | |
|---|---|---|
| | | near Hincks, Québec<br><br>production process:<br>sheet heated 0↑2000 °F (golden yellow) and grinded: .2 g + 50 cc of transparent polyester resin + 1% of catalyst / manual grinding / hardening (very light grey [light yellow reflection]) / irradiated with electrons at 155,082 rad (followed at «light grey [accentuated yellow reflection]») |
| light greyish beige or light beige-grey | 5913 | |
| | | mineral : microcline<br>rock : white (grey reflection)<br>powder : white (grey reflection)<br>origin : Buckingham, Québec<br><br>production process:<br>powder irradiated with neutrons during 2,000 seconds at $10^{12}$ neutrons / $cm^2$ / sec[706] |
| light greyish beige | 5914 | |
| light greyish beige | 5915 | production process:<br>(followed from «very light orange-beige»)<br>0↑1900 °F (light grey): .50 g + 50 ml nitric acid / soaking: 2 wk. / drying on hot plate (white [light beige reflection]) / irradiated with electrons at 302,831 rad[45] |
| light greyish beige | 5916 | production process:<br>0↑1900 °F (light grey): .10 g + 50 ml phosphoric acid / soaking: 4 years / drying on hot plate (still humid) / colour of the solid[30,707] |
| light greyish beige | 5917 | production process:<br>(followed from «very light brownish grey»)<br>rock irradiated with gamma rays at 604.53 Mrad |
| | | mineral : mussel shell or calcium carbonate<br>shell : dark indigo-blue (violet tone)<br>powder : white<br>origin : St.-Lawrence river, Baie-des-Chaleurs, Gaspésie, Québec<br><br>production process:<br>powder irradiated with gamma rays at 64.7 Mrad (followed at «medium beige [very light green reflection]») |
| light greyish beige | 5918 | |
| | | mineral : orthoclase<br>rock : light pinkish beige<br>powder : very light beige<br>origin : mine near Buckingham, Papineau county, Québec |

| | | |
|---|---|---|
| light greyish beige or light beige-grey | 5919 | production process: 2 g of orthoclase + 20 ml nitric acid / soaking: 3 d. / drying on hot plate (very light chamois): .3 g + 50 cc of transparent polyester resin + 1% of catalyst / manual grinding / moulding / hardening (very, very light grey) / irradiated with electrons at 155,082 rad (followed at «greenish grey») |
| light greyish beige or light beige-grey | 5920 | production process: 2 g of orthoclase + 20 ml hydrochloric acid / soaking: 3 d. / drying on hot plate (very, very light pink): .3 g + 50 cc of transparent polyester resin + 1% of catalyst / manual grinding / moulding / hardening (greenish grey) / irradiated with electrons at 155,082 rad (followed at «dark greenish yellow») |
| light greyish beige | 5921 | mineral : orthoclase<br>rock : white (grey reflection)<br>powder : white (grey reflection)<br>origin : mine near Buckingham, Papineau county Québec<br><br>production process: powder irradiated with gamma rays at 244.53 Mrad[433] (followed at «light orange-beige [light grey tone]») |
| light greyish beige | 5922 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process: (followed from «grey much darker than "very light grey"») 3 g of quartz - mica + 20 ml hydrofluoric acid / soaking: 24 h / drying in oven at 100 °F (very light grey) / irradiated with gamma rays at 424.7 Mrad |
| light beige (localized very light grey tone) | 5923 | production process: 3 g of quartz - mica + 20 ml hydrofluoric acid / soaking: 24 h / drying in oven at 100 °F (very light grey) / irradiated with electrons at |

1088

| | | |
|---|---|---|
| | | 302,831 rad[36] |
| light greyish beige | 5924 | mineral : shale (formation of Sillery[359])<br>rock : brownish red<br>powder : pinkish brown, mat<br>origin : bank of St.-Lawrence river at Berthier-Sur-Mer at the rear of the Dénechaud manor, Québec<br><br>mineral : cement[1138]<br>powder : white<br><br>production process:<br>(followed from «medium pinkish orange-beige»)<br>5 g of shale + 27.40 g of cement + 13 cc of water / manual grinding / moulding / hardening / 0†1900 °F[708] |
| light greyish beige | 5925 | production process:<br>1 g of shale + 27.40 g of cement + 13 cc of water / manual grinding / moulding / hardening / 0†1900 °F[708] |
| light greyish beige | 5926 | mineral : serpentine<br>rock : yellowish green<br>powder : light greenish yellow<br>origin : probably Thetford Mines, Eastern Townships, Québec<br><br>production process:<br>3 g of serpentine + 25 ml sulphuric acid / soaking: 24 h / drying on hot plate (light grey [light brown tone]): .3 g + 50 cc of transparent polyester resin + 1% of catalyst / manual grinding / moulding / hardening (very light grey [light yellow reflection]) / irradiated with electrons at 155,082 rad<br>(followed at «very light grey [accentuated yellow tone]») |
| light greyish beige | 5927 | mineral : sodalite<br>rock : light cold blue<br>powder : light grey (light blue tone)<br>origin : Bancroft, Ontario<br><br>mineral : nickel<br>powder : dark brownish grey, with metallic brilliance<br>production process:<br>1 g of sodalite +1 g of nickel / 2000 °F / 45 min. |
| | | mineral : sodalite<br>rock : indigo-blue, slightly translucid |

| | | |
|---|---|---|
| | | powder : light grey (light blue tone)<br>origin : probably Africa<br><br>production process:<br>1 g of sodalite + 5 g of pyrex / manual grinding / heating: 5 °C per min. 0↑1245 °C + maintenance during 1 h / cooling: 5 °C per min. until ambient temperature is reached / the entity is done in ambient air |
| light greyish beige | 5927.1 | |
| | | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / natural drying / addition of 25 ml nitric acid to the same solid / soaking: 3 d. / separation in 3 parts: a) the liquid (2nd) at the surface; b) the layer in the middle: a mixture of liquid and solid; c) the residual solid at the bottom of the solution / natural drying / colour of the 2nd liquid[709] |
| light greyish beige | 5928 | |
| | | mineral : spodumene<br>rock : pale green<br>powder : light grey, almost white<br>origin : Québec Lithium Co., Baraute, Abitibi, Québec<br><br>mineral : sulphur<br>rock : brilliant yellow<br>powder : brilliant yellow<br>origin : unknown<br><br>production process:<br>2 g of spodumene + 2 g of sulphur / 1300 °F / 1 h |
| light greyish beige | 5929 | |
| | | mineral : fuel oil soot[86]<br>powder : profound brownish black<br>origin : boiler room of Laval University, city of Québec, Québec<br><br>mineral : cement[1138]<br>powder : white<br><br>production process:<br>1 g of soot + 1 g of potassium carbonate + 27.40 g of cement + 13 cc of water / grinding / moulding / |
| light greyish beige | 5930 | |

| | | |
|---|---|---|
| | | hardening / 0†1900 °F[708] |
| light and fairly vivid greyish beige | 5931 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>powder irradiated with neutrons during 2,000 seconds at $10^{12}$ neutrons / $cm^2$ / sec<br>(followed at «light emerald-green») |
| greyish beige very slightly darker than «light greyish beige» | 5932 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (very light beige) / irradiated with gamma rays at 18.85 Mrad |
| beige (light grey tone) a bit darker than «light greyish beige» | 5933 | mineral : glass powder<br>powder : light grey<br>origin : residues of the cutting of the glass panes, Vitreries Lepage, city of Québec, Québec<br><br>production process:<br>(followed from «light chamois»)<br>irradiated with gamma rays at 424.7 Mrad[714] |
| greyish beige a bit darker than «light greyish beige» | 5934 | mineral : amazon stone<br>rock : light greenish turquoise, translucid<br>powder : white (turquoise reflection)<br>origin : unknown<br><br>production process:<br>(followed from «beige a bit darker than "light beige"»)<br>4 g of amazon stone + 40 ml sulphuric acid / soaking: 22 d. / drying on hot plate (light grey) / irradiated with electrons at 305,200 rad[73] |

1091

| | | |
|---|---|---|
| greyish beige a bit darker than «light greyish beige» | 5935 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «light orange-beige»)<br>2 g of quartz - mica + 2 g of sodium carbonate / 0↑1600 °F + 1 h at 1600 °F (orange-beige) / irradiated with gamma rays at 423.88 Mrad |
| greyish beige darker than «light greyish beige» | 5936 | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 20 ml hydrofluoric acid / soaking: 24 h / drying in oven at 100 °F (light grey [beige tone]) / irradiated with gamma rays at 190.22 Mrad<br>(followed at «mixture of particles: brown [orange and grey tones] / beige») |
| beige (light grey tone) considerably darker than «light greyish beige» | 5937 | mineral : microcline<br>rock : white (grey reflection)<br>powder : white (grey reflection)<br>origin : Buckingham, Québec<br><br>production process:<br>0↑2000 °F (light grey) / powder irradiated with 64.7 Mrad<br>(followed at «medium greyish beige [orange reflection]») |
| greyish beige | 5938 | mineral : apatite<br>rock : medium brownish red<br>powder : light pinkish beige<br>origin : Ile Calumet, Pontiac county, Québec<br><br>production process:<br>3 g of apatite + 25 ml sulphuric acid / soaking: 3 d. / drying on hot plate |
| | | mineral : barite<br>rock : pinkish white<br><br>powder : white<br>origin : Niobec Mine, Saint-Honoré, Saguenay, Québec |

1092

| | | |
|---|---|---|
| greyish beige | 5939 | production process:<br>0↑2000 °F (light beige [yellow reflection]) / powder irradiated with electrons at 162,431 rad (followed at «greyish beige [lilac tone]») |
| greyish beige | 5940 | mineral : fluorescent calcite<br>rock : white (localized grey or brown reflection), translucid<br>powder : white (yellow reflection)<br>origin : Bancroft, Ontario<br><br>production process:<br>powder irradiated with neutrons during 2,000 seconds at $10^{12}$ neutrons / $cm^2$ / sec[706] |
| greyish beige | 5941 | mineral : cryolite<br>rock : white, crystalline and translucid<br>powder : white<br>origin : Ivigtut, Groenland<br><br>production process:<br>0↑1600 °F (white [with yellowish areas): .20 g + 50 ml phosphoric acid / soaking: 2 wk. / drying on hot plate during 3 wk. (still humid) / colour of the solid[9] |
| greyish beige | 5942 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>(followed from «light brown»)<br>1 g of fluorine + 1 cc of white transparent synthetic enamel paint used for the car / manual grinding / application on a piece of steel sheet used for the car's body measuring 1" x 1" (greyish beige) / irradiated with gamma rays at 360 Mrad[351,352] |
| greyish beige | 5943 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml phosphoric acid / soaking: 3 d. / drying on hot plate (still humid) / colour of the solid[30] |

| | | |
|---|---|---|
| greyish beige | 5944 | mineral : fluorine<br>rock : very pale yellow, translucid<br>origin : Ohio, United States<br><br>production process:<br>(followed from «light greyish beige»)<br>rock irradiated with a UV laser beam during 35 min. on a 0.7 $cm^2$ surface with a laser energy of 0.210 Joules having a flux of 1.0 x $10^7$ W / $cm^2$ to give a total energy of 8,820 Joules[710] |
| greyish beige | 5945 | mineral : galena<br>rock : dark grey, with metallic brilliance<br>powder : dark grey, with metallic brilliance<br>origin : Trail, British Columbia<br><br>production process:<br>15 g of galena + 100 ml nitric acid / soaking: 3 wk. / drying on hot plate |
| greyish beige | 5946 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>0↑1900 °F (mixture of particles: white [yellow reflection] / brown): .40 g + 50 ml phosphoric acid / soaking: 2 wk. / drying on hot plate (still humid) / colour of the solid[30,711] |
| greyish beige<br>↓ | 5947 | mineral : olivine<br>rock : light grey, crystalline<br>powder : very light grey<br>origin : Mont Albert, Gaspésie, Québec<br><br>production process:<br>powder irradiated with gamma rays at:<br>64.7 Mrad |
| greyish beige lighter than «greyish beige» | 5948 | 424.7 Mrad |
| | | mineral : sericite shale<br>rock : light grey (green reflection)<br>powder : very, very light grey<br>origin : Magog, Québec |

| | | |
|---|---|---|
| greyish beige | 5949 | production process:<br>rock irradiated with gamma[509] rays at 122.984 Mrad[712]<br>(followed at «dark greyish beige») |
| greyish beige | 5950 | mineral : sodalite<br>rock : light cold blue<br>powder : light grey (light blue tone)<br>origin : Bancroft, Ontario<br><br>production process:<br>2 g of sodalite + 2 g of sodium carbonate / 0↑1300 °F + 1 h at 1300 °F<br>(followed at «beige [with "very light greenish turquoise particles"]») |
| greyish beige | 5951 | mineral : sphalerite[27]<br>rock : dark grey, golden yellow metallic brilliance<br>powder : dark brownish grey<br>origin : Matagami Mine, Matagami, Québec<br><br>production process:<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) the liquid (2nd) at the surface; b) the layer in the middle: a mixture of the liquid and the solid; c) the residual solid at the bottom of the solution / natural drying / colour of the solid of b) the layer in the middle [which is a mixture of liquid and solid][713] |
| beige (light grey tone) | 5952 | mineral : spodumene<br>rock : pale green<br>powder : light grey, almost white<br>origin : Québec Lithium Co., Baraute, Abitibi, Québec<br><br>production process:<br>2 g of spodumene + 80 ml nitric acid / soaking: 2 wk. / separation of the liquid and the solid / drying on hot plate (colour of the solid: white [beige reflection]) / irradiated with gamma rays at 64.7 Mrad<br>(followed at «medium greyish beige [yellow tone]») |
| | | mineral : tremolite<br>rock : medium brown (evergreen tone)<br>powder : greyish beige<br>origin : Tetreault Mine, Montauban, Portneuf county, Québec |

| | | |
|---|---|---|
| greyish beige | 5953 | <u>production process:</u><br>0↑1900 °F (orange-beige): .30 g + 50 ml phosphoric acid / soaking: 2 wk. / drying on hot plate (still humid) |
| greyish beige | 5954 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>3 g of wilsonite + 80 ml sulphuric acid / soaking: 2 wk. / drying on hot plate (white [light localized lilac reflection]) / irradiated with gamma rays at 64.7 Mrad<br>(followed at «mixture of particles: greenish grey / grey / beige / white») |
| greyish beige | 5955 | mineral : zincite<br>rock : mixture of areas: dark grey / red (orange tone)<br>powder : medium milky chocolate-brown<br>origin : Franklin, New Jersey, United States<br><br><u>production process:</u><br>0↑1900 °F (black): .40 g + 50 ml phosphoric acid / soaking: 2 wk. / drying on hot plate (still humid)[621] |
| greyish beige much lighter than «medium greyish beige» | 5957 | mineral : beryl<br>rock : intense grass-green, slightly translucid<br>powder : greenish grey<br>origin : unknown<br><br><u>production process:</u><br>3 g of beryl + 40 ml sulphuric acid / soaking: 18 d. / drying on hot plate (medium brownish grey [with a few «cobalt-blue» particles][714a]) / irradiated with gamma rays at 65.65 Mrad |
| greyish beige | 5958 | mineral : bauxite[92]<br>powder : pinkish beige, mat<br>origin : Alcan Company, French Guyana<br><br><u>production process:</u><br>(followed from «beige lighter than "medium beige"»)<br>3 g of bauxite + 25 ml sulphuric acid / soaking: |

| | | |
|---|---|---|
| lighter than «medium greyish beige» | | 24 h / drying on hot plate (medium brownish grey) / irradiated with gamma rays at 424.7 Mrad[239,715] |
| medium greyish beige | 5958.1 | production process:<br>1 g of bauxite + 6.50 g of powdered glass (spruce pine batch) / manual grinding / deposited on a ceramic plate at the state of a biscuit / heated in a furnace 0↑1000 °C in ambient air / slow cooling in furnace |
| medium greyish beige | 5959 | mineral : actinolite<br>rock : cold and light evergreen<br>powder : light grey (light green tone)<br>origin : erratic block found at Saint-Philémon, near Dorchester, Québec<br><br>production process:<br>(followed from «beige-grey»)<br>0↑1900 °F (light brown [very light orange tone]): 3 g + 80 ml sulphuric acid / soaking: 2 wk. / drying on hot plate (cold light grey) / irradiated with gamma rays at 430.4 Mrad |
| medium greyish beige | 5960 | mineral : sardonyx<br>rock : white, slightly translucid (with a light orange-amber circular area on the surface)<br>powder : very light grey<br>origin : unknown<br><br>production process:<br>4 g of sardonyx + 40 ml sulphuric acid / soaking: 22 d. / drying on hot plate |
| medium greyish beige or medium beige-grey | 5961 | mineral : amethyst<br>rock : violet, translucid<br>powder : light grey (lilac tone)<br>origin : Thunderbay, Ontario<br><br>production process:<br>2 g of amethyst + 2 g of sodium carbonate / 0↑1500 °F + 15 min. at 1500 °F (light creamy beige) / irradiated with gamma rays at 424.7 Mrad |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| medium greyish beige | 5962 | production process:<br>.50 g of asbestos + .50 g of sodium carbonate / 0↑1500 °F<br>(followed at «pinkish orange-beige») |
| | | mineral : anorthosite<br>rock : dark grey<br>powder : medium grey<br>origin : Jonquière, Lac Saint-Jean, Québec |
| medium greyish beige | 5963 | production process:<br>0↑1900 °F (medium brown): .30 g + 50 ml sulphuric acid / soaking: 2 wk. / separation of the liquid and the solid / drying on hot plate (colour of the solid: medium brownish grey) / irradiated with gamma rays at 64.7 Mrad<br>(followed at «orange-brown») |
| | | mineral : apatite<br>rock : reddish brown<br>powder : light pinkish beige<br>origin : Calumet, Pontiac county, Québec |
| medium greyish beige | 5964 | production process:<br>powder irradiated with electrons at 302,831 rad[239] |
| medium greyish beige | 5965 | production process:<br>1000 °C / 1 h (light greyish beige) / powder irradiated with electrons at 302,831 rad[36] |
| | | mineral : apatite<br>rock : dark grass-green (yellow tone), very slightly translucid<br>powder : powder filtered at 14 meshes: very, very light green; powder filtered beneath 14 meshes: light beige-grey (green tone)<br>origin : Ile Calumet, Pontiac county, Québec |
| medium greyish beige | 5966 | production process:<br>(followed from «beige-grey darker than "light beige-grey"»)<br>«light beige-grey (green tone)» powder irradiated with gamma rays at 604.53 Mrad |
| | | mineral : apatite<br>rock : pale brownish green<br>powder : very light greyish green<br>origin : Black Lake, Thetford county, Québec |

| | | |
|---|---|---|
| medium greyish beige | 5967 | <u>production process:</u><br>0↑2200 °F (very light greyish beige [green reflection]) / powder irradiated with electrons at 302,831 rad[239] |
| medium greyish beige | 5968 | mineral : bauxite[92]<br>powder : pinkish beige, mat<br>origin : Alcan Company, French Guyana<br><br><u>production process:</u><br>(followed from «light greyish brown»)<br>3 g of bauxite + 20 ml hydrofluoric acid / soaking: 24 h / drying in oven at 100 °F (light brownish grey) / irradiated with gamma rays at 424.7 Mrad |
| medium greyish beige | 5969 | mineral : barite<br>rock : pinkish white<br><br>powder : white<br>origin : Niobec Mine, Saint-Honoré, Saguenay, Québec<br><br><u>production process:</u><br>(followed from «light yellow»)<br>4 g of barite + 50 ml hydrochloric acid / soaking: 2 wk. / drying on hot plate (very light cream [light orange tone]) / irradiated with gamma rays at 424.7 Mrad |
| medium greyish beige | 5970 | mineral : beryl<br>rock : light blue, slightly translucid<br>powder : light grey<br>origin : Abitibi, Québec<br><br><u>production process:</u><br>(followed from «light beige»)<br>2 g of beryl + 2 g of sodium carbonate / 0↑1500 °F + 1 h at 1500 °F (very light azure-blue) / irradiated with gamma rays at 423.88 Mrad |
| medium greyish beige | 5971 | mineral : calcite<br>rock : light pink<br>powder : pinkish white<br>origin : Huddersfield district, Pontiac county, Québec<br><br><u>production process:</u><br>(followed from «light beige»)<br>1600 °F / 1 h (brownish grey or greyish brown [between «dark brownish grey or greyish brown» and «blackish brownish grey or greyish brown»]) / rock irradiated with electrons at 305,200 rad[73] |

| | | |
|---|---|---|
| medium beige (light grey tone) | 5972 | mineral : cement[82]<br>powder : medium cold grey<br>origin : Union des Carrières, Limoilou, Québec<br><br>production process:<br>the COCO² conducting tube is immediately connected to the furnace / 0↑1300 °F + 1 h at 1300 °F / slow cooling in furnace in the presence of gas / when cooled, sweeping of the furnace with neutral gas (oxygen: 10.1%; balance: argon) |
| medium greyish beige | 5973 | mineral : corundum<br>rock : medium grey<br>powder : light grey<br>origin : Transvaal, Africa<br><br>production process:<br>0↑1900 °F (brownish grey): 1 g + 50 ml sulphuric acid / soaking: 2 wk. / drying on hot plate (light grey [light beige tone]) / irradiated with gamma rays at 430.4 Mrad[538] |
| medium beige (light grey tone) | 5974 | production process:<br>2 g of corundum + 25 ml sulphuric acid / soaking: 24 h / drying on hot plate |
| medium greyish beige | 5975 | production process:<br>0↑2000 °F (brownish grey) / powder irradiated with gamma[239] rays at 64.7 Mrad<br>(followed at «dark greyish beige») |
| medium beige (light grey tone) | 5976 | production process:<br>(followed from «greyish beige lighter than "light greyish beige"»)<br>powder irradiated with gamma rays at 424.7[704] |
| medium greyish beige | 5977 | production process:<br>1 g of corundum + 80 ml nitric acid / soaking: 2 wk. / drying on hot plate |
| medium beige (light grey tone) | 5978 | mineral : corundum<br>rock : rusty yellow<br>powder : light grey<br>origin : Mount Eagle, Ontario<br><br>production process:<br>2 g of corundum + 25 ml sulphuric acid / soaking: 24 h / drying on hot plate |
| | | mineral : dolomite<br>rock : light grey<br>powder : light grey |

1100

| | | |
|---|---|---|
| medium beige (very, very light grey tone) | 5979 | origin : Shefferville, Ungava, Québec<br><br>production process:<br>0↑1000 °C (light beige) / powder irradiated with electrons at 302,831 rad[36] |
| medium greyish beige | 5980 | mineral : granite gneiss<br>rock : reddish beige<br>powder : medium pink (light brown tone)<br>origin : Lac Beauport, region of the city of Québec, Québec<br><br>production process:<br>0↑1900 °F (medium beige): 1 g + 50 ml sulphuric acid / soaking: 2 wk. / drying on hot plate (light greyish beige) / irradiated with electrons at 302,831 rad[36] |
| medium greyish beige | 5981 | mineral : labrador<br>rock : blackish grey<br>powder : medium grey<br>origin : Lac Saint-Jean, Québec<br><br>production process:<br>1000 °C / 1 h |
| medium greyish beige | 5982 | mineral : olivine<br>powder : colourless (green reflection)<br>origin : Mount Haven, United States<br><br>production process:<br>3 g of olivine + 20 ml hydrofluoric acid / soaking: 24 h / drying in oven at 100 °F (light cream [light orange tone]) / irradiated with gamma rays at 423.88 Mrad[262] |
| medium greyish beige | 5983 | mineral : iron pyrite<br>powder : greyish brown, with golden yellow metallic brilliance<br>origin : Rigaud Seigniory, Beauce county, Québec<br><br>production process:<br>(followed from «iron-grey [diminished brown tone]»)<br>4 g of pyrite + 25 ml nitric acid / soaking: 3 d. / drying on hot plate (light iron-grey [very light brown tone]) / irradiated with gamma rays at 423.88 Mrad |
| | | mineral : pyrophillite<br>rock : light beige (grey and pink tones), opaque |

| | | |
|---|---|---|
| medium beige (very light grey tone) | 5984 | powder : very light beige (grey and orange-pink tones)<br>origin : Carpentier district, Abitibi, Québec<br><br>production process:<br>0↑1900 °F (light beige): .20 g + 50 ml sulphuric acid / soaking: 2 wk. / drying on hot plate |
| | | mineral : sericite shale<br>rock : light grey (green reflection)<br>powder : very, very light grey<br>origin : Magog, Québec<br><br>production process:<br>(followed from «beige-grey»)<br>powder irradiated with gamma rays at: |
| greyish beige a bit darker than «greyish beige» | 5985 | 64.7 Mrad |
| ↓ | 5986 | 102.4 Mrad |
| darkens | 5987 | 148.4 Mrad |
| and | 5988 | 201.6 Mrad |
| accentuates | 5989 | 247.6 Mrad |
| itself | 5990 | 287.3 Mrad |
| ↓ towards | 5991 | 360 Mrad |
| medium greyish beige | 5992 | 424.7 Mrad |
| medium greyish beige | 5993 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>(followed from «violet-pink»)<br>0↑2300 °F (light grey [pinkish beige tone]) / powder irradiated with gamma rays at 424.7 Mrad[704] |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : sulphur<br>rock : brilliant yellow<br>powder : brilliant yellow<br>origin : unknown |

| | | |
|---|---|---|
| medium greyish beige | 5994 | production process:<br>2 g of wilsonite + 2 g of sulphur / 1300 °F / 1 h (light grey) / irradiated with gamma rays at 424.7 Mrad[81] |
| medium greyish beige [grey tone a bit more accentuated] | 5995 | mineral : apatite<br>rock : reddish brown<br>powder : light pinkish beige<br>origin : Calumet, Pontiac county, Québec<br><br>production process:<br>1 g of apatite + 1 cc of white opaque printing ink / mechanical grinding / 4 superimpositions on white glazed paper (medium greyish beige) / irradiated with gamma rays at 22.8 Mrad[708a] |
| beige a bit darker and grey than «medium greyish beige» | 5996 | mineral : mica<br>rock : golden brown, with vitreous luster, translucid<br>powder : light amber, with vitreous luster, translucid<br>origin : Lac Vert mountain, region of Low, near Hincks, Québec<br><br>production process:<br>(followed from «caramel-beige [orange tone]»)<br>4 g of mica + 50 ml nitric acid / soaking: 4 wk. / drying on hot plate (caramel-beige [pronounced orange tone]) / irradiated with gamma rays at 424.7 Mrad[239] |
| greyish beige darker [slightly more grey] than «medium greyish beige» | 5997 | mineral : calcite<br>rock : light pink<br>powder : pinkish white<br>origin : Huddersfield district, Pontiac county, Québec<br><br>production process:<br>1300 °F / 1 h (medium greyish beige [pink reflection]) / powder irradiated with electrons at 302,831 rad[36] |
| greyish beige very slightly darker | 5998 | mineral : halite[41]<br>rock : colourless<br>powder : colourless<br>origin : Seleine Mine, Iles-de-la-Madeleine, Québec<br><br>production process:<br>1 g of halite + 1 cc of white transparent printing ink / mechanical grinding / 8 superimpositions on |

| | | |
|---|---|---|
| than «medium greyish beige» | | white glazed paper (medium beige [light grey tone]) / irradiated with gamma rays at 5.7 Mrad[649] |
| beige (light grey tone) very slightly darker than «medium greyish beige» | 5999 | mineral : obsidian<br>rock : very dark smoky grey, almost black<br>powder : light grey<br>origin : Arkansas, United States<br><br>production process:<br>.50 g of obsidian + 1 cc of white transparent printing ink / mechanical grinding / 13 superimpositions on white glazed paper (medium beige) / irradiated with gamma rays at 5.7 Mrad[649] |
| greyish beige a bit darker than «medium greyish beige» | 6000 | mineral : corundum<br>rock : medium grey<br>powder : light grey<br>origin : Transvaal, Africa<br><br>production process:<br>1 g of corundum + 80 ml nitric acid / soaking: 2 wk. / drying on hot plate (medium greyish beige) / irradiated with gamma[239] rays at 70.4 Mrad (followed at «dark greyish beige [light orange tone]») |
| | | mineral : apatite<br>rock : light grass-green (light blue and yellow tones), very slightly translucid<br>powder : very light grey (light green tone)<br>origin : region of Buckingham, Québec<br><br>production process:<br>1 g of apatite + 1 cc of white transparent printing ink / mechanical grinding / 8 superimpositions on white glazed paper (medium beige) / irradiated with gamma rays at: |
| greyish beige a bit darker and grey than «medium greyish beige» | 6001 | 5.7 Mrad |
| ↓ | | |
| greyish beige still a bit darker | 6002 | 11.4 Mrad |
| ↓ | | |
| greyish beige still a bit darker | 6003 | 17.91 Mrad[684] |
| | | mineral : gypsum<br>rock : white (yellow reflection) |

| | | |
|---|---|---|
| greyish beige a bit darker than «medium greyish beige» | 6004 | powder : white (yellow reflection)<br>origin : Geisborough, Nova Scotia<br><br><u>production process:</u><br>1 g of gypsum + 1 cc of white transparent printing ink / mechanical grinding / 10 superimpositions on white glazed paper (medium beige [light grey tone]) / irradiated with gamma rays at 11.4 Mrad[89,649] |
| greyish beige darker than «medium greyish beige» | 6005 | mineral : cement[82]<br>powder : medium cold grey<br>origin : Union des Carrières, Limoilou, Québec<br><br><u>production process:</u><br>(followed from «light beige»)<br>45 g of cement + 100 ml sulphuric acid <u>or</u> cement entirely covered with sulphuric acid / soaking: 3 months / drying on hot plate (medium grey [yellow tone]) / irradiated with gamma rays at 424.7 Mrad |
| greyish beige darker and more grey than «medium greyish beige»<br>↓<br>greyish beige still a bit darker | 6006<br><br><br><br><br>6007 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>1 g of fluorine + 1 cc of white transparent printing ink / mechanical grinding / 8 superimpositions on white glazed paper (medium greyish beige) / irradiated with gamma rays at:<br>5.7 Mrad[716]<br><br><br><br><br>22.8 Mrad |
| | | mineral : apatite<br>rock : dark grass-green (yellow tone), very slightly translucid<br>powder : powder filtered at 14 meshes: very, very light green; powder filtered beneath 14 meshes: light beige-grey (green tone)<br>origin : Ile Calumet, Pontiac county, Québec<br><br>mineral : sulphur<br>rock : brilliant yellow<br>powder : brilliant yellow |

| | | |
|---|---|---|
| dark greyish beige | 6008 | origin : unknown<br><br><u>production process:</u><br>(followed from «pinkish beige»)<br>2 g of apatite + 2 g of sulphur / 1300 °F / 1 h (light beige [light pink tone]) / irradiated with gamma rays at 424.7 Mrad |
| dark greyish beige | 6009 | mineral : corundum<br>rock : medium grey<br>powder : light grey<br>origin : Transvaal, Africa<br><br><u>production process:</u><br>(followed from «medium greyish beige»)<br>0↑2000 °F (brownish grey) / powder irradiated with gamma[239] rays at 424.7 Mrad |
| dark greyish beige | 6010 | mineral : dolomite<br>rock : light grey<br>powder : light grey<br>origin : Shefferville, Ungava, Québec<br><br><u>production process:</u><br>(followed from «brownish grey»)<br>powder irradiated with gamma rays at 604.53 Mrad |
| dark greyish beige | 6011 | mineral : fluorine<br>rock : very pale yellow, translucid<br>origin : Ohio, United States<br><br><u>production process:</u><br>powder irradiated with neutrons during 2,000 seconds at $10^{12}$ neutrons / $cm^2$ / sec[704,717] |
| dark beige (light grey tone) | 6012 | mineral : granite gneiss<br>rock : reddish beige<br>powder : medium pink (light brown tone)<br>origin : Lac Beauport, region of the city of Québec, Québec<br><br><u>production process:</u><br>0↑2000 °F (medium beige [light pink reflection]) / irradiated with electrons at 302,831 rad[36] |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown |

| | | |
|---|---|---|
| | | mineral : cement[1138]<br>powder : white<br><br>production process:<br>(followed from «dark greyish beige [with brownish orange areas]»)<br>1 g of goethite + 1 g of sulphur + 27.40 g of cement + 13 cc of water / manual grinding / moulding / hardening / 0↑1900 °F[708] |
| dark greyish beige | 6013 | |
| dark greyish beige | 6014 | production process:<br>(followed from «dark greyish beige [pink tone]»)<br>0↑1400 °F / slow cooling in furnace (indian red[107]): 1 g + 1 g of sulphur + 1 g of sodium carbonate + 27.40 g of cement + 13 cc of water / manual grinding / moulding / hardening / 0↑1900 °F[708] |
| dark greyish beige | 6015 | mineral : labrador<br>rock : blackish grey<br>powder : medium grey<br>origin : Lac Saint-Jean, Québec<br><br>production process:<br>(followed from «light greyish beige»)<br>1000 °C / 1 h (medium greyish beige) / powder irradiated with gamma rays at 424.7 Mrad |
| dark greyish beige | 6016 | mineral : amazon stone<br>rock : light greenish turquoise, translucid<br>powder : white (turquoise reflection)<br>origin : unknown<br><br>mineral : sulphur<br>rock : brilliant yellow<br>powder : brilliant yellow<br>origin : unknown<br><br>production process:<br>1 g of microcline + 1 g of sulphur / 1600 °F / 1 h |
| | | mineral : ochre[98]<br>powder : yellow<br>origin : small copper and nickel deposit, in the South-Western area of a mass of serpentinite at 3 km at the West of Saint-Fabien-de-Panet, Québec |

| | | |
|---|---|---|
| dark greyish beige | 6017 | production process:<br>(followed from «brownish grey»)<br>10 g of ochre + 100 ml sulphuric acid / soaking: 1 wk. / drying on hot plate (light brownish grey) / irradiated with gamma rays at 424.7 Mrad |
| dark greyish beige | 6018 | mineral : uraninite<br>rock : medium chocolate-brown (red Bordeau tone)<br>powder : medium milky chocolate-brown<br>origin : Yellowknife, Canada<br><br>production process:<br>(followed from «mixture of particles: greenish yellow / orange-brown»)<br>0↑1900 °F (medium orange-brown): 1 g + 50 ml sulphuric acid / soaking: 2 wk. / drying on hot plate (greenish yellow) / irradiated with gamma rays at 423.88 Mrad |
| dark greyish beige | 6019 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>(followed from «very light yellow»)<br>0↑1900 °F (dark iron-grey): .50 g + 50 ml sulphuric acid / soaking: 2 wk. / drying on hot plate (light yellowish cream [light grey tone]) / irradiated with gamma rays at 430.4 Mrad |
| dark greyish beige | 6020 | mineral : pyrolusite[101]<br>rock : black (light brown tone), mat<br>powder : black (light brown tone), mat<br>origin : probably Nova Scotia<br><br>mineral : sulphur<br>rock : brilliant yellow<br>powder : brilliant yellow<br>origin : unknown<br><br>production process:<br>1 g of pyrolusite + 2 g of sodium carbonate + 1 g of sulphur / 0↑1600 °F<br>(followed at «very powerful emerald-green») |
| | | mineral : sericite shale<br>rock : light grey (green reflection)<br>powder : very, very light grey<br>origin : Magog, Québec |

| | | |
|---|---|---|
| dark greyish beige | 6021 | production process:<br>(followed from «greyish beige»)<br>rock irradiated with gamma[509] rays at 482.984 Mrad[718] |
| dark greyish beige | 6022 | mineral : spodumene<br>rock : pale green<br>powder : light grey, almost white<br>origin : Québec Lithium Co., Baraute, Abitibi, Québec<br><br>production process:<br>(followed from «beige-grey»)<br>powder irradiated with gamma rays at 424.7 Mrad |
| dark greyish beige [still more grey: between «grey» and «beige»] | 6023 | mineral : spodumene<br>rock : pale green<br>powder : light grey, almost white<br>origin : Québec Lithium Co., Baraute, Abitibi, Québec<br><br>mineral : sulphur<br>rock : brilliant yellow<br>powder : brilliant yellow<br>origin : unknown<br><br>production process:<br>(followed from «greyish beige [light pink tone]»)<br>2 g of spodumene + 2 g of sulphur / 1300 °F / 1 h (light greyish beige) / irradiated with gamma rays at 424.7 Mrad |
| dark greyish beige | 6024 | mineral : steatite<br>rock : light evergreen<br>powder : white<br>origin : East Broughton, Québec<br><br>production process:<br>(followed from «brownish grey»)<br>0↑1500 °F (light brownish grey) / powder irradiated with gamma rays at 424.7 Mrad |
| | | mineral : cobalt sulphide[597]<br>rock : dark grey, with metallic brilliance<br>powder : dark grey<br>origin : Cobalt, Ontario |

| | | |
|---|---|---|
| dark greyish beige | 6025 | <u>production process:</u><br>4 g of cobalt sulphide + 20 ml hydrochloric acid / soaking: 24 h / separation of the liquid and the solid / drying on hot plate (colour of the solid: medium brownish grey[55,1080]) / irradiated with electrons at 302,831 rad[36] |
| dark greyish beige | 6026 | mineral : tremolite<br>rock : medium brown (evergreen tone)<br>powder : greyish beige<br>origin : Tetreault Mine, Montauban, Portneuf county, Québec<br><br><u>production process:</u><br>6 g of tremolite + 50 ml sulphuric acid / soaking: 2 wk. / drying on hot plate (white) / irradiated with gamma rays at 424.7 Mrad[81] |
| dark greyish beige | 6027 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>2 g of iron sulphide - nickel + 2 g of sodium carbonate / 0↑1000 °F + 1 h at 1000 °F (followed at «beige [light orange reflection] lighter than "dark orange-beige"») |
| dark greyish beige | 6028 | mineral : vesuvianite<br>rock : lilac<br>powder : lilac<br>origin : John Mansville Mine, Asbestos, Québec<br><br><u>production process:</u><br>(followed from «beige»)<br>12 g of vesuvianite + 40 ml sulphuric acid / soaking: 10 d. / drying on hot plate (white [pink reflection]) / irradiated with gamma rays at 425.65 Mrad |
| mixture of particles | | |
| | | mineral : mica<br>rock : golden brown, with vitreous luster, translucid<br>powder : light amber, with vitreous luster, translucid |

1110

| | | |
|---|---|---|
| very light greyish beige / white | 6029 | origin : Lac Vert mountain, region of Low, near Hincks, Québec<br><br>production process:<br>(followed from «orange a bit lighter than "orange"»)<br>2 g of mica + 2 g of sodium carbonate / 0↑1600 °F + 1 h at 1600 °F (orange) / irradiated with gamma rays at 423.88 Mrad |
| light greyish beige / pale brown / dark chocolate-brown | 6030 | mineral : biotite gneiss<br>rock : blackish grey, golden vitreous brilliance<br>powder : dark grey<br>origin : Grenville geological province, Québec<br><br>production process:<br>12 g of gneiss + 40 ml sulphuric acid / soaking: 22 d. / drying on hot plate (mixture of particles: light beige / white) / irradiated with gamma rays at 424.7 Mrad |
| mostly beige (light grey reflection) / very light mint-green | 6031 | mineral : amazon stone<br>rock : light greenish turquoise clair, translucid<br>powder : white (turquoise reflection)<br>origin : unknown<br><br>production process:<br>(followed from «white [yellow reflection]»)<br>4 g of microcline + 40 ml hydrochloric acid / soaking: 1 wk. / separation of the liquid and the solid / natural drying (colour of the solid: white [apple-green reflection]) / irradiated with electrons at 305,200 rad[73] |
| greyish beige (lilac tone) | | |
| greyish beige (lilac tone) darker than «greyish beige (lilac tone)» | 6032 | mineral : barite<br>rock : pinkish white<br><br>powder : white<br>origin : Niobec Mine, Saint-Honoré, Saguenay, Québec<br><br>production process:<br>(followed from «greyish beige»)<br>0↑2000 °F (light beige [yellow reflection]) / irradiated with electrons at 302,831 rad[45] |

1111

| | | |
|---|---|---|
| medium greyish beige (localized lilac or violet reflection) | 6033 | production process:<br>(followed from «greyish beige [pink reflection]») 0↑1900 °F (greyish beige [pink reflection]) / irradiated with electrons at 302,831 rad[45,719] |
| greyish beige (pinkish violet tone) | | |
| greyish beige (light pinkish violet tone or violet-pink tone) much darker than «light greyish beige (pinkish violet tone or violet-pink tone)» | 6034 | mineral : fluorine<br>rock : violet and white, translucid<br>powder : very light grey<br>origin : Saint-Lawrence Fluorspar Company, Saint-Lawrence, Newfoundland<br><br>mineral : sulphur<br>rock : brilliant yellow<br>powder : brilliant yellow<br>origin : unknown<br>production process:<br>2 g of fluorine + 2 g of sulphur / 1300 °F / 1 h (light greyish beige) / irradiated with gamma rays at 64.7 Mrad<br><br>(followed at «medium reddish violet [grey tone]») |
| greyish beige (blue tone) | | |
| light beige (localized bluish grey tone) | 6035 | mineral : dolomite<br>rock : white (localized yellow reflection), crystalline and translucid<br>powder : white<br>origin : Bristol district, Pontiac county, Québec<br>production process:<br>(followed from «bluish grey tint / brownish grey tint»)<br>rock irradiated with gamma rays at 360 Mrad<br>(followed at «beige more accentuated than "light beige"») |
| light beige (light bluish grey tone or greenish grey tone) | 6036 | mineral : microcline<br>rock : white (grey reflection)<br>powder : white (grey reflection)<br>origin : Buckingham, Québec<br>production process:<br>2 g of microcline + 2 g of sodium carbonate / 0↑1400 °F + 1 h at 1400 °F (white [grey reflection]) / irradiated with gamma rays at 63.88 Mrad (followed at «mixture of particles: light beige / |

| | | |
|---|---|---|
| | | white») |
| beige (grey tone with localized blue reflection) or grey (beige tone with localized blue reflection), much more accentuated than «light greyish beige» or «light beige-grey» | 6037 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>6 g of molybdenite + 50 ml sulphuric acid / soaking: 4 years / drying on hot plate (light grey [with «blue» particles]) / irradiated with gamma rays at 64.7 Mrad<br><br>(followed at «medium brownish grey [with "accentuated blue" particles]») |
| greyish beige (green tone) | | |
| very light greyish beige (green reflection) | 6038 | mineral : apatite<br>rock : pale brownish green<br>powder : very light greyish green<br>origin : Black Lake, Thetford county, Québec<br><br>production process:<br>powder heated 0↑2200 °F |
| very light greyish beige (localized green reflection) | 6039 | mineral : galena<br>rock : dark grey, with metallic brilliance<br>powder : dark grey, with metallic brilliance<br>origin : Sullivan deposit, COMINCO Co., Co-Trail, British Columbia<br><br>mineral : sulphur<br>rock : brilliant yellow<br>powder : brilliant yellow<br>origin : unknown<br><br>mineral : cement[1138]<br>powder : white<br><br>production process:<br>(followed from «apple-green» [plus sodium carbonate])<br>1 g of galena + 1 g of sulphur + 1 g of potassium carbonate + 27.40 g of cement + 13 cc of water / manual grinding / moulding / hardening / |

1113

| | | |
|---|---|---|
| | | 0↑1900 °F[708] |
| greyish beige (light green reflection) more intense than «very light greyish beige (green tone)» | 6040 | mineral : sphalerite[31]<br>rock : honey-yellow<br>powder : pale honey-yellow<br>origin : Federal Mine, Lemieux district, Gaspésie, Québec<br><br>production process:<br>(followed from «greyish beige»)<br>4 g of sphalerite + 20 ml hydrofluoric acid / soaking: 24 h / drying in oven at 100 °F (medium brown [grey tone]): .3 g + 50 cc of transparent polyester resin + 1% of catalyst / manual grinding / moulding / hardening (light greyish beige [yellow reflection]) / irradiated with electrons at 305,082 rad[354] |
| greyish beige (localized accentuated green tone) much darker than «very light greyish beige (green tone)» | 6041 | mineral : pyrrhotite[276]<br>rock : dark greyish brown, with yellow golden metallic brilliance<br>powder : dark grey<br>origin : Inco Co., Sudbury, Ontario<br><br>production process:<br>4 g of pyrrhotite + 20 ml sulphuric acid / soaking: 3 d. / drying on hot plate (very light beige [light localized green tone]) / irradiated with gamma rays at 64.7 Mrad<br><br>(followed at «greenish beige») |
| light greyish beige (green reflection lightly more accentuated) | 6041.1 | mineral : bauxite[92]<br>powder : pinkish beige, mat<br>origin : Alcan Company, French Guyana<br><br>production process:<br>20 g of bauxite + 20 g of caustic soda / 0↑982 °C<br>(followed at «creamy beige [apple-green tone]») |
| light greyish beige (green tone) | 6042 | mineral : beryl<br>rock : light blue (near turquoise), slightly translucid<br>powder : light grey<br>origin : Lacorne district, Abitibi, Québec<br><br>production process:<br>(followed from «very, very light green»)<br>1600 °F / 1 h (white [bluish grey reflection]) / rock irradiated with gamma rays at 425.65 Mrad |

| | | |
|---|---|---|
| light greyish beige (localized green reflection) | 6043 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>mineral : sulphur<br>rock : brilliant yellow<br>powder : brilliant yellow<br>origin : unknown<br><br>mineral : cement[1138]<br>powder : white<br><br>production process:<br>1 g of shale + 1 g of sulphur + 1 g of sodium carbonate + 27.40 g of cement + 13 cc of water / manual grinding / moulding / hardening / 0↑1900 °F[708] |
| light greyish beige (localized green reflection) | 6044 | production process:<br>1 g of shale + 1 g of sulphur + 27.40 g of cement + 13 cc of water / manual grinding / moulding / hardening / 0↑1900 °F[708] |
| light greyish beige (localized green reflection) | 6045 | mineral : steatite<br>rock : light cold grey, slightly translucid<br>powder : light grey<br>origin : East Broughton, Québec<br><br>production process:<br>(followed from «light greenish yellow»)<br>2 g of steatite + 2 g of sodium carbonate / 0↑1800 °F + 1 h at 1800 °F (creamy yellow [light green reflection]) / irradiated with gamma rays at 424.7 Mrad[239] |
| greyish beige (light green tone) | 6046 | mineral : galena<br>rock : dark grey, with metallic brilliance<br>powder : dark grey, with metallic brilliance<br>origin : Sullivan deposit, COMINCO Co., Co-Trail, British Columbia<br><br>mineral : sulphur<br>rock : brilliant yellow<br>powder : brilliant yellow<br>origin : unknown<br><br>production process:<br>2 g of galena + 2 g of sulphur / 1300 °F / 1 h (apple-green) / irradiated with electrons at |

| | | |
|---|---|---|
| | | 162,431 rad |
| greyish beige (light green reflection) a bit darker than «greyish beige (green reflection)» | 6047 | mineral : tremolite<br>rock : medium brown (evergreen tone)<br>powder : greyish beige<br>origin : Tetreault Mine, Montauban, Portneuf county, Québec<br><br>production process:<br>powder irradiated with electrons at 162,431 rad |
| greyish beige (light green reflection) darker than «greyish beige (green tone)» | 6048 | mineral : anorthosite<br>rock : dark grey<br>powder : medium grey<br>origin : Jonquière, Lac Saint-Jean, Québec<br><br>production process:<br>(followed from «light orange-beige»)<br>2 g of anorthosite + 2 g of sodium carbonate / 0↑1500 °F + 1 h at 1500 °F (green [between «apple-green» and «mint-green»]) / irradiated with gamma rays at 424.7 Mrad |
| medium greyish beige (localized very, very light green reflection) | 6049 | mineral : dolomite<br>rock : light grey<br>powder : light grey<br>origin : Sheffervilie, Ungava, Québec<br>production process:<br>2 g of dolomite + 2 g of sodium carbonate / 0↑1500 °F + 1 h at 1500 °F (mixture of particles: light green / beige) / irradiated with gamma rays at 423.88 Mrad[262] |
| medium beige (grey and green tones) | 6050 | mineral : clay<br>block : pale greyish green<br>powder : pale greyish green<br>origin : bank of St.-Lawrence river at the rear of the Miguasha Museum, Saspésie, Québec<br>production process:<br>(followed from «intense greyish green [yellow reflection]»)<br>powder irradiated with gamma rays at 424.7 Mrad |
| | | mineral : beryl<br>rock : very light yellowish green, slightly |

| | | |
|---|---|---|
| | | translucid<br>powder : white (green reflection)<br>origin : Lacorne district, Abitibi, Québec |
| greyish beige (light green tone) a bit darker than «medium greyish beige (green tone)» | 6051 | <u>production process:</u><br>(followed from «brownish beige [grey and pink tones]»)<br>2 g of beryl + 2 g of sodium carbonate / 0↑1300 °F + 1 h at 1300 °F (medium brownish beige [grey and pink tones]) / irradiated with gamma rays at 424.7 Mrad |
| dark greyish beige (green reflection) | 6052 | mineral : andulusite<br>rock : light brownish grey<br>powder : light grey<br>origin : Bimbowrie, South Australia<br><br><u>production process:</u><br>(followed from «olive-green lighter than "light olive-green"»)<br>4 g of andulusite + 80 ml hydrochloric acid / soaking: 2 wk. / separation of the liquid and the solid / drying on hot plate (colour of the solid: light olive-green) / irradiated with gamma rays at 430.4 Mrad |
| dark greyish beige (green tone) | 6053 | mineral : chromite[294]<br>rock : dark grey<br>powder : dark grey<br>origin : Black Lake, Eastern Townships, Québec<br><br>mineral : cement[269]<br>powder : medium brownish grey<br>origin : CALCO, Charlesbourg, Québec<br><u>production process:</u><br>(followed from «medium mossy brownish green»)<br>.50 g of chromite + 1.50 g of cement / 1000 °C / 1 h (medium mossy brownish green) / irradiated with gamma rays at 424.7 Mrad[239] |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white |

1117

| | | |
|---|---|---|
| dark greyish beige (localized green reflection) ↓ | 6054 | production process: (followed from «medium brownish pink») 1 g of goethite + 1 g of sulphur + 1 g of sodium carbonate + 27.40 g of cement + 13 cc of water / manual grinding / moulding / hardening: 0↑1800 °F[708] |
| dark greyish beige (localized green reflection) | 6055 | 0↑1900 °F[708] |
| greyish beige (yellow tone) | | |
| greyish beige (yellow tone) a bit more intense than «very, very light greyish beige (yellow tone)» | 6056 | mineral : apatite<br>rock : medium brownish red<br>powder : light pinkish beige<br>origin : Ile Calumet, Pontiac county, Québec<br><br>production process: (followed from «ivory») .2 g of apatite + 50 cc of transparent polyester resin + 1% of catalyst / manual grinding / moulding / hardening (very, very light greyish beige [weak yellow tone]) / irradiated with electrons at 305,082 rad[354] |
| very light greyish beige (light yellow tone) | 6057 | mineral : armenite<br>rock : light grey<br>powder : very light grey<br>origin : Abitibi, Québec<br><br>production process: 1 g of armenite + 50 ml sulphuric acid / soaking: 2 wk. / drying on hot plate (white [light beige or grey reflection]) / irradiated with gamma rays at 64.7 Mrad (followed at «medium beige [orange-pink tone]») |
| greyish beige (light yellow reflection) a bit darker than «very light greyish beige | 6058 | mineral : apatite<br>rock : reddish brown<br>powder : light pinkish beige<br>origin : Calumet, Pontiac county, Québec<br><br>production process: (followed from «light beige») .2 g of apatite + 50 cc of transparent polyester resin + 1% of catalyst / manual grinding / moulding / hardening (very light greyish beige [light yellow reflection]) / irradiated with electrons at 305,082 rad[354] |

| | | |
|---|---|---|
| (yellow tone)» | | |
| light greyish beige (light yellow tone)<br>↓<br>greyish beige (considerably lightened yellow tone) | 6059<br><br><br>6060 | production process:<br>1000 °C / 1 h (light greyish beige) / powder irradiated with gamma rays at:<br>63.984 Mrad<br><br>122.984 Mrad<br><br>(followed at «medium orange-beige») |
| greyish beige (accentuated yellow reflection) darker than «light greyish beige (yellow tone)» | 6061 | mineral : calcite<br>rock : light pink<br>powder : pinkish white<br>origin : Huddersfield district, Pontiac county, Québec<br><br>production process:<br>(followed from «beige darker than "light beige"»)<br>4 g of calcite + 20 ml nitric acid / soaking: 3 d. / drying on hot plate (orange[24]): .3 g + 50 cc of transparent polyster resin + 1% of catalyst / manual grinding / moulding / hardening (light beige [light yellow reflection]) / irradiated with electrons at 305,082 rad[354] |
| medium greyish beige (light yellow tone) | 6062 | mineral : corundum<br>rock : medium grey<br>powder : light grey<br>origin : Transvaal, Africa<br><br>production process:<br>1 g of corundum + 50 ml hydrochloric acid / soaking: 2 wk. / drying on hot plate |
| medium greyish beige (light yellow tone) | 6063 | mineral : spodumene<br>rock : pale green<br>powder : light grey, almost white<br>origin : Québec Lithium Co., Baraute, Abitibi, Québec<br><br>production process:<br>(followed from «beige [light grey tone]»)<br>2 g of spodumene + 80 ml nitric acid / soaking: 2 wk. / separation of the liquid and the solid / drying on hot plate (colour of the solid: white [beige reflection]) / irradiated with gamma rays at 424.7 Mrad |
| greyish beige (greenish yellow tone) | | |

| | | |
|---|---|---|
| more accentuated greyish beige (acute greenish yellow reflection) | 6064 | mineral : fluorescent calcite<br>rock : white (localized grey or brown reflection), translucid<br>powder : white (yellow reflection)<br>origin : Bancroft, Ontario<br><u>production process:</u><br>(followed from «beige-grey [light yellow reflection]»)<br>4 g of calcite + 20 ml nitric acid / soaking: 3 d. / separation of the liquid and the solid / drying on hot plate (colour of the solid: dark brownish grey): .3 g + 50 cc of transparent polyester resin + 1% of catalyst / manual grinding / moulding / hardening (light beige-grey [light yellow reflection]) / irradiated with electrons at 305,082 rad[354] |
| greyish beige (orange tone) | | |
| light greyish beige (light orange reflection) | 6065 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><u>production process:</u><br>1 g of goethite + 1 g of titanium dioxide + 1 g of sodium carbonate + 1 g of zirconium silicate / 1600 °F / 1 h (dark orange-beige): .15 g + 40 ml sulphuric acid / soaking: 6 d. / drying on hot plate: 6 d. / drying on hot plate |
| greyish beige (orange reflection) lighter than «greyish beige (orange reflection)» | 6066 | mineral : calcite<br>rock : light pink<br>powder : pinkish white<br>origin : Huddersfield district, Pontiac county, Québec<br><u>production process:</u><br>(followed from «greyish beige [pink tone]»)<br>1300 °F / 1 h (medium greyish beige [pink reflection]) / irradiated with gamma rays at 424.7 Mrad |
| | | mineral : goethite[106]<br>powder : rusty orange |

1120

| | | |
|---|---|---|
| | | origin : Red Mill, in the suburbs of Cap-de-la -Madeleine, Québec<br><br>mineral : sulphur<br>rock : brilliant yellow<br>powder : brilliant yellow<br>origin : unknown<br><br>mineral : cement[1138]<br>powder : white<br><br><u>production process:</u><br>(followed from «greyish beige [pink tone]»)<br>0↑1400 °F / slow cooling in furnace (indian red[107]): 1 g + 1 g of sulphur + 27.40 g of cement + 13 cc of water / manual grinding / moulding / hardening / 0↑1900 °F[708] |
| greyish beige [with orange areas], darker than «greyish beige (orange tone)» | 6067 | |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>.45 g of molybdenite + 5 g of pyrex / manual grinding / heating: 5 °C per min. 0↑1245 °C + maintenance during 1 h / cooling: 5 °C per min. until ambient temperature is reached / the entity is done in ambient air (very light beige-grey) / irradiated with gamma rays at 9.88 Mrad |
| medium greyish beige (light orange reflection) | 6067.1 | |
| | | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : unknown<br><br><u>production process:</u><br>(followed from «orange-beige lighter than "light orange-beige"»)<br>2 g of serpentine + 2 g of sulphur / 1300 °F / 1 h (light orange-beige) / irradiated with gamma rays at 424.7 Mrad[720] |
| meidum greyish beige (orange reflection) | 6068 | |

1121

| | | |
|---|---|---|
| medium greyish beige (orange tone) | 6069 | mineral : barite<br>rock : pinkish white<br><br>powder : white<br>origin : Niobec Mine, Saint-Honoré, Saguenay, Québec<br><br>production process:<br>(followed from «mixture of particles: blue / light pink»)<br>1700 °F / 1 h (cream) / powder irradiated with gamma rays at 424.7 Mrad |
| medium greyish beige (light orange tone) | 6070 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «beige»)<br>powder irradiated with gamma rays at 604.53 Mrad |
| medium greyish beige (orange reflection) | 6071 | mineral : granite gneiss<br>rock : reddish beige<br>powder : medium pink (light brown tone)<br>origin : Lac Beauport, region of the city of Québec, Québec<br>production process:<br>(followed from «beige very slightly more accentuated than "light beige"»)<br>0↑1900 °F (medium beige): 1 g + 50 ml nitric acid / soaking: 2 wk. / drying on hot plate (mixture of particles: grey / light brown) / irradiated with gamma rays at 430.4 Mrad[239] |
| intense and dark medium greyish beige (orange reflection) | 6072 | mineral : gypsum<br>rock : white (yellow reflection)<br>powder : white (yellow reflection)<br>origin : Geisborough, Nova Scotia<br><br>mineral : sulphur<br>rock : brilliant yellow<br>powder : brilliant yellow<br>origin : unknown<br>production process:<br>(followed from «very light pinkish beige»)<br>2 g of gypsum + 2 g of sulphur / 1300 °F / 1 h (very light beige [very light orange tone]) / irradiated with gamma rays at 424.7 Mrad |

| | | |
|---|---|---|
| medium greyish beige (orange reflection) | 6073 | mineral : microcline<br>rock : white (grey reflection)<br>powder : white (grey reflection)<br>origin : Buckingham, Québec<br><br>production process:<br>(followed from «greyish beige»)<br>0↑2000 °F (light grey) / powder irradiated with gamma rays at 424.7 Mrad |
| medium greyish beige (light orange tone) | 6074 | mineral : orthoclase<br>rock : light pinkish beige<br>powder : very light beige<br>origin : mine near Buckingham, Papineau county, Québec<br><br>production process:<br>(followed from «greyish beige darker than "very greyish beige"» and «light pink»)<br>powder irradiated with gamma rays at 424.7 Mrad[721] |
| medium greyish beige (light orange tone) | 6075 | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br>production process:<br>(followed from «light greenish yellow»)<br>4 g of pyrrhotite + 50 ml sulphuric acid / soaking: 2 wk. / drying on hot plate (white [light yellow or beige reflection]) / irradiated with gamma rays at 430.4 Mrad |
| medium greyish beige (light orange tone) | 6076 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «brownish beige»)<br>0↑2000 °F (very light beige-grey) / powder irradiated with gamma rays at 424.7 Mrad |
| | | mineral : steatite<br>rock : light evergreen<br>powder : white<br>origin : East Broughton, Québec |

| | | |
|---|---|---|
| medium greyish beige (orange tone) | 6077 | <u>production process:</u><br>2 g of steatite + 80 ml nitric acid / soaking: 2 wk. / drying on hot plate |
| greyish beige (orange tone) a bit more intense than «medium greyish beige (orange tone)» | 6078 | <u>production process:</u><br>2 g of steatite + 80 ml nitric acid / soaking: 2 wk. / drying on hot plate (medium greyish beige [orange tone]) / irradiated with gamma$^{239}$ rays at 70.4 Mrad<br>(followed at «dark greyish beige [orange tone]») |
| dark greyish beige (light orange reflection) | 6079 | mineral : actinolite<br>rock : cold and light evergreen<br>powder : light grey (light green tone)<br>origin : erratic block found at Saint-Philémon, near Dorchester, Québec<br><br>mineral : sulphur<br>rock : brilliant yellow<br>powder : brilliant yellow<br>origin : unknown<br><br><u>production process:</u><br>(followed from «orange-beige»)<br>2 g of actinolite + 2 g of sulphur / 1300 °F / 1 h (medium orange-beige) / irradiated with gamma rays at 424.7 Mrad |
| dark greyish beige (light orange reflection) | 6080 | mineral : apatite<br>rock : pale brownish green<br>powder : very light greyish green<br>origin : Black Lake, Thetford county, Québec<br><br>mineral : sulphur<br>rock : brilliant yellow<br>powder : brilliant yellow<br>origin : unknown<br><br><u>production process:</u><br>(followed from «beige darker than "light beige"»)<br>2 g of apatite + 2 g of sulphur / 1300 °F / 1 h (light beige [very light orange tone]) / irradiated with gamma rays at 424.7 Mrad |
| | | mineral : apophyllite<br>rock : milky white, translucid<br>powder : white<br>origin : Gaspé Copper Mine, Gaspé, Québec<br><br><u>production process:</u><br>(followed from «light beige») |

| | | |
|---|---|---|
| dark greyish beige (light orange tone) | 6081 | 1 g of apophyllite + 60 ml sulphuric acid / soaking: 2 wk. / drying on hot plate (white [cream reflection]) / irradiated with gamma rays at 424.7 Mrad |
| dark greyish beige (light orange tone) | 6082 | production process:<br>(followed from «orange-yellow»)<br>1 g of apophyllite + 60 ml hydrochloric acid / soaking: 2 wk. / drying on hot plate (light orange-yellow) / irradiated with gamma rays at 424.7 Mrad |
| dark greyish beige (light orange tone) | 6083 | mineral : corundum<br>rock : medium grey<br>powder : light grey<br>origin : Transvaal, Africa<br><br>production process:<br>(followed from «medium greyish beige»)<br>1 g of corundum + 80 ml nitric acid / soaking: 2 wk. / drying on hot plate (medium greyish beige) / irradiated with gamma[239] rays at 430.4 Mrad |
| dark greyish beige (light orange reflection) | 6084 | mineral : granite gneiss<br>rock : reddish beige<br>powder : medium pink (light brown tone)<br>origin : Lac Beauport, region of the city of Québec, Québec<br><br>production process:<br>(followed from «brownish beige [light pink reflection]»)<br>0↑2000 °F (medium beige [light pink reflection]) / powder irradiated with gamma rays at 424.7 Mrad |
| dark greyish beige (light orange tone) | 6085 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white<br><br>production process:<br>(followed from «medium brownish beige»)<br>0↑1400 °F / slow cooling in furnace (indian red[107]): .10 g + 1 g of feldspar (medium brown |

1125

| | | |
|---|---|---|
| | | [orange-red tone]): 1 g + 4.50 g of cement + 3 cc of water / manual grinding / moulding / hardening / 0↑1900 °F<br>(followed at «pale milky chocolate-brown [light pinkish orange tone]») |
| dark greyish beige (localized orange reflection) | 6086 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «beige [orange-pink tone]»)<br>0↑1900 °F (medium rusty brown): 2 g + 50 ml sulphuric acid / soaking: 2 wk. / drying on hot plate (medium beige [light orange-pink tone]) / irradiated with gamma rays at 424.7 Mrad |
| dark greyish beige (orange tone) | 6087 | mineral : peridotite<br>rock : medium grey<br>powder : medium brownish grey (green reflection)<br>origin : Thetford Mines, Québec<br><br>production process:<br>(followed from «greyish beige darker than "light greyish beige"»)<br>0↑1900 °F (orange-brown): .20 g + 50 ml sulphuric acid / soaking: 2 wk. / drying on hot plate (very light greyish beige) / irradiated with gamma rays at 424.7 Mrad |
| dark greyish beige (very light orange tone) | 6088 | mineral : pyrophillite<br>rock : light beige (grey and pink tones), opaque<br>powder : very light beige (grey and orange-pink tones)<br>origin : Carpentier district, Abitibi, Québec<br><br>production process:<br>(followed from «greyish beige [orange-pink tone]»)<br>powder irradiated with gamma rays at 424.7 Mrad |
| | | mineral : steatite<br>rock : light evergreen<br>powder : white<br>origin : East Broughton, Québec |

1126

| | | |
|---|---|---|
| dark greyish beige (orange tone) | 6089 | production process:<br>(followed from «beige»)<br>2 g of steatite + 20 ml of a solution of tartric acid[35] / soaking: 3 d. / drying on hot plate (white [light creamy reflection]) / irradiated with gamma rays at 423.88 Mrad |
| dark greyish beige (more pronounced orange tone) | 6090 | production process:<br>(followed from «greyish beige [orange tone]»)<br>2 g of steatite + 80 ml nitric acid / soaking: 2 wk. / drying on hot plate (medium greyish beige [orange tone]) / irradiated with gamma[239] rays at 430.4 Mrad |
| dark greyish beige (orange tone) | 6091 | production process:<br>(followed from «medium greyish beige [green reflection]»)<br>0↑2200 °F (light brown): 2 g + 50 ml sulphuric acid / soaking: 2 wk. / drying on hot plate (mixture of particles: beige / white) / irradiated with gamma[45,571] rays at 430.4 Mrad |
| greyish beige (greenish orange tone) | | |
| dark greyish beige (orange tone) [localized green reflection] | 6092 | mineral : corundum<br>rock : medium grey<br>powder : light grey<br>origin : Transvaal, Africa<br>production process:<br>(followed from «orange-beige [green tone]»)<br>1 g of corundum + 50 ml hydrochloric acid / soaking: 2 wk. / drying on hot plate (medium greyish beige [light yellow tone]») / irradiated with gamma rays at 430.4 Mrad[239] |
| greyish beige (pinkish orange tone) | | |
| medium greyish beige (pinkish orange reflection) | 6093 | mineral : barite<br>rock : pinkish white<br><br>powder : white<br>origin : Niobec Mine, Saint-Honoré, Saguenay, Québec<br><br>mineral : sulphur<br>rock : brilliant yellow<br>powder : brilliant yellow<br>origin : unknown<br>production process:<br>2 g of barite + 2 g of sulphur / 1300 °F / 1 h (very light pinkish beige) / irradiated with gamma rays at 424.7 Mrad[81,722] |
| | | mineral : sodalite |

1127

| | | |
|---|---|---|
| | | rock : light cold blue<br>powder : light grey (light blue tone)<br>origin : Bancroft, Ontario<br><br>mineral : sulphur<br>rock : brilliant yellow<br>powder : brilliant yellow<br>origin : unknown<br><br>production process:<br>(followed from «pinkish beige»)<br>2 g of sodalite + 2 g of sulphur / 1300 °F / 1 h (medium pinkish beige) / irradiated with gamma rays at 424.7 Mrad |
| dark greyish beige (pinkish orange tone) | 6094 | |
| | | mineral : steatite<br>rock : light cold grey, slightly translucid<br>powder : light grey<br>origin : East Broughton, Québec<br><br>production process:<br>(followed from «light beige»)<br>powder irradiated with gamma rays at: |
| dark greyish beige (very light pinkish orange tone)<br>↓ | 6095 | 244.53 Mrad |
| dark greyish beige (very light pinkish orange tone) | 6096 | 604.53 Mrad |
| greyish beige (reddish orange tone) | | |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «reddish orange [violet tone]»)<br>50 g of asbestos + 200 ml hydrochloric acid or asbestos entirely covered with hydrochloric acid / soaking: 1 wk. / drying on hot plate (vivid yellow): 4 g + 4 g of sodium carbonate / 0↑1400 °F (followed from «mixture of particles: greyish beige [reddish orange tone] / greenish turquoise») |
| greyish beige (light reddish orange tone) | 6097 | |
| | | mineral : goethite[106]<br>powder : rusty orange<br>origin : Red Mill, in the suburbs of Cap-de-la-Madeleine, Québec |

1128

| | | |
|---|---|---|
| | | mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>(followed from «medium brownish grey [violet reflection]») |
| greyish beige (reddish orange tone) | 6098 | 1 g of goethite + 2 g of sulphur + 1 g of titanium dioxide / 1500 °F / 1 h<br>(followed at «medium brownish grey [violet-pink reflection]» and at «dark brown [violet-red tone]») |
| mixture of particles | | |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «greyish beige [light reddish orange tone]») |
| greyish beige (light reddish orange tone) / light greenish turquoise | 6099 | 50 g of asbestos + 200 ml hydrochloric acid <u>or</u> asbestos entirely covered with hydrochloric acid / soaking: 1 wk. / drying on hot plate (vivid yellow): 4 g + 4 g of sodium carbonate / 0↑1500 °F<br>(followed at «accentuated greenish turquoise») |
| greyish beige (brownish orange tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br>production process:<br>(followed from «medium milky chocolate-brown [pink tone]») |

| | | |
|---|---|---|
| dark greyish beige (with brownish orange areas) | 6100 | 1 g of goethite + 1 g of sulphur + 27.40 g of cement + 13 cc of water / manual grinding / moulding / hardening / 0↑1800 °F[708]<br>(followed at «dark greyish beige») |
| greyish beige (pink tone) | | |
| very pale beige (very, very light grey and pink tones) | 6101 | mineral : calcite<br>rock : light pink<br>powder : pinkish white<br>origin : Huddersfield district, Pontiac county, Québec<br><br><u>production process:</u><br>powder irradiated with electrons at 302,831 rad[45] |
| very light greyish beige (light pink tone) | 6102 | mineral : chalcopyrite<br>powder : dark grey (light green tone)<br>origin : Centre de recherche des Mines Noranda in Montréal, Québec<br><br>mineral : sulphur<br>rock : brilliant yellow<br>powder : brilliant yellow<br>origin : unknown<br><br><u>production process:</u><br>(followed from «beige [very light orange-pink tone a bit lighter than "light beige [orange-pink tone]»)<br>2 g of chalcopyrite + 2 g of sulphur / 1300 °F / 1 h (light beige [very light orange-pink tone]) / irradiated with electrons at 302,831 rad[45] |
| light greyish beige (light pink reflection)<br>↓ | 6103 | mineral : Gaspé agate<br>rock : marbled nodule with shaded tints of white, pink and light grey, slightly translucid<br>powder : very light pinkish grey<br>origin : Mont Lyall, Gaspésie, Québec<br><br><u>production process:</u><br>rock irradiated with gamma rays at:<br>5 Mrad |
| greyish beige a bit more pale (light pink reflection) | 6104 | 10 Mrad<br><br>(followed at «beige-grey») |

1130

| | | |
|---|---|---|
| light greyish beige (pronounced pink tone) | 6105 | mineral : kaolin<br>rock : chalk-white (yellow reflection)<br>powder : chalk-white (yellow reflection)<br>origin : Saint-Rémi d'Amherst, Québec<br><br>mineral : sulphur<br>rock : brilliant yellow<br>powder : brilliant yellow<br>origin : unknown<br><br>production process:<br>(followed from «very, very light pinkish beige»)<br>2 g of kaolin + 2 g of sulphur / 1300 °F / 1 h (chalk-white [light yellow reflection]) / irradiated with gamma rays at 424.7 Mrad |
| light greyish beige (pink reflection) | 6106 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «light pinkish beige [grey tone]»)<br>2 g of molybdenite + 2 g of sodium carbonate / 1300 °F / 1 h<br>(followed at «intense bluish green») |
| light greyish beige (accentuated pink tone) | 6107 | mineral : ochre[128]<br>powder : black<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «light pinkish beige [grey tone]»)<br>1 g of ochre + 1 g of zirconium silicate + 1 g of titanium dioxide / 0↑1500 °F<br>(followed at «light brownish beige [pink tone]») |
| | | mineral : spodumene<br>rock : pale green<br>powder : light grey, almost white<br>origin : Québec Lithium Co., Baraute, Abitibi, Québec |

1131

| | | |
|---|---|---|
| greyish beige (light pink tone) darker than «light greyish beige (pink tone)» | 6108 | mineral : sulphur<br>rock : brilliant yellow<br>powder : brilliant yellow<br>origin : unknown<br><br>production process:<br>2 g of spodumene + 2 g of sulphur / 1300 °F / 1 h (light greyish beige) / irradiated with gamma rays at 64.7 Mrad<br>(followed at «dark greyish beige») |
| greyish beige (pink reflection) | 6109 | mineral : barite<br>rock : pinkish white<br>powder : white<br>origin : Niobec Mine, Saint-Honoré, Saguenay, Québec<br><br>production process:<br>0↑1900 °F<br>(followed at «light beige [yellow reflection]») |
| greyish beige [with pink areas] | 6110 | mineral : goethite[106]<br>powder : rusty orange<br>origin : Red Mill, in the suburbs of Cap-de-la-Madeleine, Québec<br><br>mineral : cement[1138]<br>powder : white<br><br>mineral : sulphur<br>rock : brilliant yellow<br>powder : brilliant yellow<br>origin : unknown<br><br>production process:<br>(followed from «violet-pink»)<br>0↑1400 °F / slow cooling in furnace (indian red[107]): 1 g + 1 g of sulphur + 27.40 g of cement + 13 cc of water / manual grinding / moulding / hardening / 0↑1800 °F[708]<br>(followed at «greyish beige [orange tone]») |
| greyish beige (light pink tone) darker than | 6111 | mineral : calcite<br>rock : light pink<br>powder : pinkish white<br>origin : Huddersfield district, Pontiac county, Québec<br><br>production process:<br>1300 °F / 1 h (medium greyish beige [pink reflection]) / irradiated with gamma rays at 64.7 Mrad<br>(followed at «greyish beige [orange reflection]») |

| | | |
|---|---|---|
| «greyish beige (pink tone)» | | |
| greyish beige (pink reflection) much darker than «greyish beige (pink reflection)» | 6112 | mineral : barite<br>rock : pinkish white<br><br>powder : white<br>origin : Niobec Mine, Saint-Honoré, Saguenay, Québec<br><br>production process:<br>0↑1900 °F (greyish beige [pink reflection]) / irradiated with electrons at 162,431 rad (followed at «greyish beige [lilac or violet reflection]») |
| medium greyish beige (pink reflection) | 6113 | mineral : fluorescent calcite<br>rock : white (localized grey or brown reflection), translucid<br>powder : white (yellow reflection)<br>origin : Bancroft, Ontario<br><br>production process:<br>(followed from «very light beige»)<br>4 g of calcite + 20 ml sulphuric acid / soaking: 3 d. / drying on hot plate (white [light beige reflection]) / irradiated with gamma rays at 424.7 Mrad |
| medium greyish beige (pink reflection) | 6114 | mineral : calcite<br>rock : light pink<br>powder : pinkish white<br>origin : Huddersfield district, Pontiac county, Québec<br><br>production process:<br>1300 °F / 1 h |
| medium greyish beige (localized pink reflection) | 6115 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «old rose»)<br>4 g of sandstone + 80 ml sulphuric acid / soaking: 2 wk. / drying on hot plate (old rose) / irradiated with gamma rays at 424.7 Mrad |

| | | |
|---|---|---|
| medium greyish beige (pink tone) | 6116 | mineral : kaolin<br>rock : chalk-white (yellow reflection)<br>powder : chalk-white (yellow reflection)<br>origin : Saint-Rémi d'Amherst, Québec<br><br>production process:<br>(followed from «very, very light pinkish beige»)<br>0↑1900 °F (white [light pink reflection]): .20 g + 25 ml sulphuric acid / soaking: 2 wk. / drying on hot plate (white [accentuated pink reflection]) / irradiated with gamma rays at 424.7 Mrad |
| medium greyish beige (pink tone) | 6117 | mineral : ochre[111]<br>powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «light grey [pink tone]»)<br>1 g of ochre + 1 g of zirconium silicate + 1 g of titanium dioxide / 0↑1300 °F<br>(followed at «light salmon») |
| medium greyish beige (pink reflection) | 6118 | mineral : steatite<br>rock : light evergreen<br>powder : white<br>origin : East Broughton, Québec<br><br>production process:<br>0↑2200 °F (light brown): 2 g + 50 ml sulphuric acid / soaking: 2 wk. / drying on hot plate (mixture of particles: beige / white) / irradiated with gamma[239,571] rays at 70.4 Mrad<br>(followed at «dark greyish beige [orange tone]») |
| | | mineral : andulusite<br>rock : light brownish grey<br>powder : light grey<br>origin : Bimbowrie, South Australia<br><br>mineral : sulphur<br>rock : brilliant yellow<br>powder : brilliant yellow<br>origin : unknown |

| | | |
|---|---|---|
| greyish beige (light pink tone) darker [brown] than «medium greyish beige (pink tone)» | 6119 | production process:<br>2 g of andulusite + 2 g of sulphur / 1300 °F / 1 h (medium beige [light orange-pink tone]) / irradiated with gamma rays at 424.7 Mrad[81] |
| dark greyish beige [with pinkish areas] | 6120 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br>production process:<br>(followed from «medium beige-pink»)<br>0↑1400 °F / slow cooling in furnace (indian red[107]): 1 g + 1 g of sulphur + 1 g of sodium carbonate + 27.40 g of cement + 13 cc of water / manual grinding / moulding / hardening / 0↑1800 °F[708]<br>(followed at «dark greyish beige») |
| greyish beige (orange-pink tone) | | |
| | | mineral : pyrophillite<br>rock : light beige (grey and pink tones), opaque<br>powder : very light beige (grey and orange-pink tones)<br>origin : Carpentier district, Abitibi, Québec<br><br>production process:<br>powder irradiated with gamma rays at: |
| light greyish beige (light orange-pink tone) | 6121 | 5 Mrad |
| ↓ darkens and | 6122 | 10 Mrad |
| | 6123 | 57.4 Mrad |
| | 6124 | 64.7 Mrad |
| | 6125 | 102.4 Mrad |
| | 6126 | 148.4 Mrad |
| | 6127 | 201.6 Mrad |
| | 6128 | 247.6 Mrad |
| | 6129 | 287.3 Mrad |

1135

| | | |
|---|---|---|
| becomes more brown | 6130 | 360 Mrad<br>(followed at «dark greyish beige [orange tone]») |
| medium greyish beige (orange-pink tone) | 6131 | mineral : corundum<br>rock : medium grey<br>powder : light grey<br>origin : Transvaal, Africa<br><br>production process:<br>(followed from «pinkish beige lighter than "light pinkish beige"»)<br>1 g of corundum + 50 ml sulphuric acid / soaking: 2 wk. / drying on hot plate (light beige-grey) / irradiated with gamma rays at 430.4 Mrad |
| dark greyish beige (light orange-pink tone) | 6132 | mineral : peridotite<br>rock : medium grey<br>powder : medium brownish grey (green reflection)<br>origin : Thetford Mines, Québec<br>production process:<br>(followed from «mixture of particles: green / beige»)<br>4 g of peridotite + 100 ml sulphuric acid / soaking: 2 wk. / drying on hot plate (white [beige reflection]) / irradiated with gamma rays at 430.4 Mrad |
| dark greyish beige (very, very light orange-pink reflection) | 6133 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : sulphur<br>rock : brilliant yellow<br>powder : brilliant yellow<br>origin : unknown<br>production process:<br>2 g of iron sulphide - nickel + 2 g of sulphur / 1300 °F / 1 h (medium beige [light pink tone]) / irradiated with gamma rays at 424.7 Mrad[81] |
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec |

1136

| | | |
|---|---|---|
| dark greyish beige (light orange-pink tone) | 6134 | <u>production process:</u><br>(followed from «light brownish beige»)<br>1 g of yofortierite + 50 ml sulphuric acid / soaking: 2 wk. / separation of the liquid and the solid / drying on hot plate (colour of the liquid: intense blue) / irradiated with gamma rays at 424.7 Mrad |

BEIGE (BROWN TONE)

| colour obtained | number | mineral / production process |
|---|---|---|
| pale brownish beige | 6135 | mineral : actinolite<br>rock : cold and light evergreen<br>powder : light grey (light green tone)<br>origin : erratic block found at Saint-Philémon near Dorchester, Québec<br><br>mineral : sulphur<br>rock : brilliant yellow<br>powder : brilliant yellow<br>origin : unknown<br><br><u>production process:</u><br>2 g of actinolite + 2 g of sulphur / 1300 °F / 1 h (medium orange-beige) / irradiated with electrons at 302,831 rad[36] |
| beige (accentuated brown tone) darker than «very light brownish beige» | 6136 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>0↑2000 °F (very light beige-grey) / powder irradiated with gamma rays at 64.7 Mrad (followed at «medium greyish beige [light orange tone]») |
| brownish beige lighter than «light brownish beige» | 6137 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>0↑900 °F (fairly dark yellowish beige): 1 g + 40 ml sulphuric acid / soaking: 14 d. / drying on hot plate (light brownish beige) / irradiated with electrons at 305,200 rad[46] |

1138

| | | |
|---|---|---|
| light brownish beige | 6138 | mineral : andulusite<br>rock : light brownish grey<br>powder : light grey<br>origin : Bimbowrie, South Australia<br><br>production process:<br>2 g of andulusite + 2 g of sodium carbonate / 0↑1400 °F + 1 h at 1400 °F (beige [light green tone]) / irradiated with gamma rays at 63.88 Mrad (followed at «beige») |
| light brownish beige | 6139 | mineral : anorthosite<br>rock : light grey<br>powder : very, very light greyish beige<br>origin : rang Sainte-Germaine, Oka, Québec<br><br>mineral : calcite[11]<br>powder : white<br>origin : Calcite du Nord Company, Saint-Eugène de Mistassini, Lac Saint-Jean, Québec<br><br>production process:<br>1 g of anorthosite + 1 g of calcite / 1000 °C / 1 h |
| light brownish beige | 6140 | mineral : antigorite<br>rock : pale yellowish green<br>powder : very pale greenish yellow<br>origin : Canadian Refractories Mine, Kilmar, Québec<br><br>production process:<br>(followed from «medium orange-beige»)<br>2 g of serpentine + 2 g of sodium carbonate / 0↑1900 °F + 1 h at 1900 °F (mixture of particles: olive-green / beige) / irradiated with electrons at 302,831 rad[45] |
| light brownish beige | 6141 | mineral : bauxite[92]<br>powder : pinkish beige, mat<br>origin : Alcan Company, French Guyana<br><br>mineral : cement[1138]<br>powder : white<br><br>production process:<br>1 g of bauxite + 1 g of potassium carbonate + 27.40 g of cement + 13 cc of water / manual grinding / moulding / hardening / 0↑1900 °F |
| | | mineral : fluorine |

| | | |
|---|---|---|
| light brownish beige | 6142 | rock : white (pink reflection), translucid<br>powder : white (grey reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate |
| light brownish beige | 6143 | mineral : galena<br>rock : dark grey, with metallic brilliance<br>powder : dark grey, with metallic brilliance<br>origin : Trail, British Columbia<br><br>mineral : calcite[11]<br>powder : white<br>origin : Calcite du Nord Company, Saint-Eugène de Mistassini, Lac Saint-Jean, Québec<br><br>production process:<br>1 g of galena + 1 g of calcite / 1000 °C / 1 h |
| light brownish beige | 6144 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «light pinkish beige [brown tone]»)<br>1 g of ochre + 2 g of titanium dioxide / 0↑1650 °F<br>(followed at «light yellowish beige») |
| | | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec |

| | | |
|---|---|---|
| light brownish beige still more brown | 6145 | <u>production process:</u><br>(followed from «light brownish beige [light pink tone]»)<br>1 g of ochre + 1 g of zirconium silicate + 1 g of titanium dioxide / 0↑1700 °F |
| light brownish beige | 6146 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>0↑900 °F (fairly dark yellowish beige): 1 g + 40 ml sulphuric acid / soaking: 14 d. / drying on hot plate |
| light brownish beige<br>↓<br>brownish beige still more brown<br>↓<br>brownish beige still more brown | 6147<br><br>6148<br><br>6149 | mineral : serpentine<br>rock : yellowish green<br>powder : light greenish yellow<br>origin : probably Thetford Mines, Eastern Townships, Québec<br><br><u>production process:</u><br>(followed from «light beige»)<br>2 g of serpentine + 2 g of sodium carbonate:<br>0↑1100 °F + 1 h at 1100 °F<br><br>0↑1200 °F + 1 h at 1200 °F<br><br>(followed at «light orange-brown»)<br><br>(followed at «pale orange»)<br><br>0↑1500 °F + 1 h at 1500 °F<br>(followed at «greenish beige») |
| light brownish | 6150 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><u>production process:</u><br>1 g of iron sulphide - nickel + 4.50 g of cement + |

| | | |
|---|---|---|
| beige | | 3 cc of water / manual grinding / moulding / hardening / 0↑1900 °F[708,723]<br><br>(followed from «brown a bit more accentuated than "brown"») |
| light brownish beige | 6151 | 0↑1600 °F (pinkish beige [light grey tone]): 1 g + 4.50 g of cement + 3 cc of water / manual grinding / moulding / hardening / 0↑1600 °F |
| brownish beige which is a bit more accentuated | 6152 | 0↑1700 °F (pinkish beige [grey tone slightly more accentuated]) + 4.50 g of cement + 3 cc of water / manual grinding / moulding / hardening / 0↑1700 °F |
| ↓ brownish beige which is still a bit more accentuated | 6153 | 0↑2000 °F (greyish brown): 1 g + 4.50 g of cement + 3 cc of water / manual grinding / moulding / hardening / 0↑1900 °F[708] |
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br><u>production process:</u> |
| light brownish beige | 6154 | 1 g of yofortierite + 50 ml sulphuric acid / soaking: 2 wk. / separation of the liquid and the solid / drying on hot plate (colour of the liquid: intense blue) / irradiated with gamma rays at 64.7 Mrad<br>(followed at «dark greyish beige [light orange-pink tone]») |
| | | mineral : corundum<br>rock : medium grey<br>powder : light grey<br>origin : Transvaal, Africa<br><br><u>production process:</u> |
| brownish beige a bit darker and brown than «light brownish beige» | 6155 | powder irradiated with electrons at 302,831 rad[36] |
| | | mineral : andulusite<br>rock : light brownish grey<br>powder : light grey<br>origin : Bimbowrie, South Australia |

1142

| | | |
|---|---|---|
| brownish beige a bit more brown and dark than «light brownish beige« | 6156 | <u>production process:</u><br>(followed from «very light beige»)<br>2 g of andulusite + 2 g of sodium carbonate / 0↑1400 °F + 30 min. at 1400 °F (beige) / irradiated with gamma rays at 424.7 Mrad |
| brownish beige darker than «light brownish beige» | 6157 | mineral : amazonite<br>rock : light greenish turquoise<br>powder : white (turquoise reflection)<br>origin : Lac Sairs, Témiscamingue, Québec<br><br><u>production process:</u><br>2 g of amazonite + 2 g of sodium carbonate / 0↑1500 °F + 1 h at 1500 °F (grey a bit darker than «very, very light grey [almost white]») / irradiated with gamma rays at 64.7 Mrad<br>(followed at «mixture of particles: cream [grey tone] / white / medium grey / pale grey / medium brownish beige») |
| brownish beige darker than «light brownish beige» | 6158 | mineral : granite gneiss<br>rock : reddish beige<br>powder : medium pink (light brown tone)<br>origin : Lac Beauport, region of the city of Québec, Québec<br><br><u>production process:</u><br>0↑1900 °F (medium beige): 1 g + 50 ml sulphuric acid / soaking: 2 wk. / drying on hot plate (light greyish beige) / irradiated with gamma rays at 70.4 Mrad<br>(followed at «dark orange-beige [light grey tone]») |
| | | mineral : sphalerite[27]<br>rock : dark grey, golden yellow metallic brilliance<br>powder : dark brownish grey<br>origin : Mine Matagami, Matagami, Québec<br><br><u>production process:</u><br>4 g of sphalerite + 25 ml nitric acid / soaking: 3 d. / separation of the liquid (1st) and the solid / natural drying (colour of the 1st liquid: light cream [beige tone]) / irradiated with gamma rays at: |
| brownish beige much darker than «light brownish beige»<br>↓ | 6159 | 64.7 Mrad |
| brownish beige still darker | 6160 | 424.7 Mrad |

1143

| | | |
|---|---|---|
| | | mineral : sardonyx<br>rock : white, slightly translucid (with a light orange-amber circular area on the surface)<br>powder : very light grey<br>origin : unknown<br><br>production process:<br>4 g of sardonyx + 40 ml hydrochloric acid / soaking: 14 d. / separation of the liquid and the solid / drying on hot plate (colour of the solid: very light pinkish beige [with green particles]) / irradiated with gamma rays at: |
| brownish beige | 6161 | 65.65 Mrad |
| ↓ | | |
| darker brownish beige | 6162 | 425.65 Mrad |
| | | mineral : asbestos[4]<br>rock : dark grey (green reflection)<br>powder : light grey (green reflection)<br>origin : Asbestos Corporation Ltd., Thetford Mines, Québec<br><br>mineral : chrome<br>powder : light grey, with metallic brilliance<br><br>production process: |
| brownish beige | 6163 | 1 g of asbestos + 1 g of chrome / 2000 °F / 45 min. |
| | | mineral : asbestos[4]<br>rock : dark grey (green reflection)<br>powder : light grey (green reflection)<br>origin : Asbestos Corporation Ltd., Thetford Mines, Québec<br><br>mineral : nickel<br>powder : dark brownish grey, with metallic brilliance<br>production process: |
| brownish beige | 6164 | 1 g of asbestos + 1 g of nickel / 2000 °F / 45 min. |
| | | mineral : asbestos[4]<br>rock : dark grey (green reflection)<br>powder : light grey (green reflection)<br>origin : Asbestos Corporation Ltd., Thetford Mines, Québec<br><br>mineral : silica[91]<br>powder : very light grey, crystalline<br>origin : mine exploited by Développement Gex |

1144

| | | |
|---|---|---|
| brownish beige | 6165 | Inc. of Montréal for exploitation by SKW Bécancour. Lac La Galette, Charlevoix county, 30 miles at the North of Saint-Urbain, Québec<br><br>production process:<br>1 g of asbestos + 1 g of silica / 2000 °F / 45 min.[626] |
| brownish beige (cristalline reflection) | 6166 | mineral : asbestos[4]<br>rock : dark grey (green reflection)<br>powder : light grey (green reflection)<br>origin : Asbestos Corporation Ltd., Thetford Mines, Québec<br><br>mineral : serpentine<br>rock : yellowish green<br>powder : light greenish yellow<br>origin : probably Thetford Mines, Eastern Townships, Québec<br><br>production process:<br>1 g of asbestos + 1 g of serpentine / 2000 °F / 45 min.[626] |
| brownish beige | 6167 | mineral : feldspar<br>rock : white, opaque<br>powder : white<br>origin : Baraute, Abitibi, Québec<br><br>production process:<br>(followed from «greenish yellow»)<br>rock irradiated with gamma[67,73] rays at 604.53 Mrad |
| brownish beige | 6168 | mineral : apatite<br>rock : pale brownish green<br>powder : very light greyish green<br>origin : Black Lake, Thetford county, Québec<br><br>mineral : sulphur<br>rock : brilliant yellow<br>powder : brilliant yellow<br>origin : unknown<br><br>production process:<br>2 g of apatite + 2 g of sulphur / 1300 °F / 1 h (light beige [very light orange tone]) / irradiated with electrons at 302,831 rad[239] |

| | | |
|---|---|---|
| brownish beige | 6169 | mineral : apatite<br>rock : reddish brown<br>powder : light pinkish beige<br>origin : Calumet, Pontiac county, Québec<br><br>mineral : calcite[11]<br>powder : white<br>origin : Calcite du Nord Company, Saint-Eugène de Mistassini, Lac Saint-Jean, Québec<br><br>production process:<br>1 g of apatite + 1 g of calcite / 1000 °C / 1 h |
| brownish beige (with blue particles) | 6170 | mineral : cerite<br>rock : dark brownish grey<br>powder : light grey (light brown tone)<br>origin : Jamestown, Boulder county, Colorado, United States<br><br>production process:<br>2 g of cerite + 2 g of sodium carbonate / 0↑1300 °F + 1 h at 1300 °F<br>(followed at «brown») |
| beige (light brown tone) | 6171 | mineral : chalcocite<br>rock : dark iron-grey (with localized turquoise oxidation)<br>powder : dark iron grey<br>origin : Butte, Montana, United States<br><br>production process:<br>(followed from «light grey» and «green»)<br>2 g of chalcocite + 2 g of sodium carbonate / 1900 °F / 1 h (mixture of particles: beige / brown [with metalized copper particles]) / irradiated with gamma rays at 424.7 Mrad |
| brownish beige | 6172 | mineral : olivine<br>rock : light grey, crystalline<br>powder : very light grey<br>origin : Mont Albert, Gaspésie, Québec<br><br>production process:<br>(followed from «light beige»)<br>2 g of olivine + 2 g of sodium carbonate / 0↑1100 °F + 1 h at 1100 °F<br>(followed at «medium orange-beige») |
| | | mineral : ochre[128]<br>powder : black<br>origin : Red Mill, in the suburbs of Cap-de-la-Madeleine, Québec |

1146

| | | |
|---|---|---|
| brownish beige still more brown than «brownish beige» | 6173 | mineral : titanium dioxide<br>powder : white<br>origin : NL Chem Canada Inc., Québec<br><br>production process:<br>(followed from «brownish beige [pink tone]»)<br>1 g of ochre + 1 g of titanium dioxide /<br>0↑1700 °F |
| | | mineral : serandite<br>rock : beige (light pinkish orange tone), opaque<br>powder : light pink<br>origin : De-Mix quarry, North side of Mont Saint-Hilaire, Rouville county, Québec<br><br>production process: |
| brownish beige<br>↓ | 6174 | 0↑500 °F |
| darker brownish beige<br>↓ | 6175 | 0↑600 °F |
| a bit darker brownish beige | 6176 | 0↑700 °F<br>(followed from «yellowish beige») |
| brownish beige | 6177 | mineral : spodumene<br>rock : pale green<br>powder : light grey, almost white<br>origin : Québec Lithium Co., Baraute, Abitibi, Québec<br><br>production process:<br>2 g of spodumene + 2 g of sodium carbonate /<br>0↑1000 °F + 1 h at 1000 °F<br>(followed at «pinkish beige») |
| brownish beige | 6178 | mineral : steatite<br>rock : light cold grey, slightly translucid<br>powder : light grey<br>origin : East Broughton, Québec<br><br>mineral : nickel<br>powder : dark brownish grey, with metallic brilliance<br><br>production process:<br>1 g of steatite + 1 g of nickel / 2000 °F / 45 min. |

1147

| | | |
|---|---|---|
| | | mineral : steatite<br>rock : light cold grey, slightly translucid<br>powder : light grey<br>origin : East Broughton, Québec<br><br><u>production process:</u><br>(followed from «creamy beige darker than "light creamy beige [light yellow tone]"» and «beige [light brown tone]» and «light grey») |
| beige (light brown tone) ↓ | 6179 | 0↑1300 °F (grey [light brown tone]): 2 g + 25 ml nitric acid / soaking: 3 d. / drying on hot plate |
| brownish beige still a bit more brown ↓ | 6180 | 0↑1400 °F (grey [more accentuated brown tone]): 2 g + 25 ml nitric acid / soaking: 3 d. / drying on hot plate |
| brownish beige still a bit more brown ↓ | 6181 | 0↑1500 °F (grey [brown tone still more accentuated]): 2 g + 25 ml nitric acid / soaking: 3 d. / drying on hot plate |
| brownish beige still a bit more brown | 6182 | 0↑1600 °F (grey [brown tone still more accentuated]): 2 g + 25 ml nitric acid / soaking: 3 d. / drying on hot plate<br>(followed at «orange-beige») |
| | | mineral : steatite<br>rock : light evergreen<br>powder : white<br>origin : East Broughton, Québec<br><br><u>production process:</u> |
| beige (light brown tone) | 6183 | 0↑1200 °F (light grey [light brown tone]): 2 g + 20 ml hydrochloric acid / soaking: 3 d. / drying on hot plate |
| | | <u>production process:</u><br>(followed from «orange-beige»)<br>2 g of steatite + 2 g of sodium carbonate / |
| beige (light brown tone) ↓ | 6184 | 0↑1400 °F + 1 h at 1400 °F |
| brownish beige still lightly more brown ↓ | 6185 | 0↑1500 °F + 1 h at 1500 °F |
| brownish beige identical to the previous one | 6186 | 0↑1600 °F + 1 h at 1600 °F<br><br>(followed at «green») |
| | | mineral : vesuvianite<br>rock : lilac |

| | | |
|---|---|---|
| brownish beige | 6187 | powder : lilac<br>origin : John Mansville Mine, Asbestos, Québec<br><br>production process:<br>12 g of vesuvianite + 40 ml hydrochloric acid / soaking: 1 wk. / drying on sand bath (light yellowish beige) / irradiated with gamma rays at 64.7 Mrad<br>(followed at «medium chocolate-brown») |
| beige (light brown tone) | 6188 | mineral : steatite<br>rock : light cold grey, slightly translucid<br>powder : light grey<br>origin : East Broughton, Québec<br><br>production process:<br>(followed from «creamy beige [light yellow tone]»)<br>0↑1200 °F (grey more accentuated than «light grey»): 2 g + 5 ml hydrochloric acid + 20 ml nitric acid / soaking: 3 d. / drying on hot plate |
| brownish beige | 6189 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>1 g of yofortierite + 50 ml hydrochloric acid / soaking: 2 wk. / drying on hot plate (beige) / irradiated with electrons at 162,431 rad |
| brownish beige very, very lightly darker and more vivid than «brownish beige» | 6190 | mineral : cerite<br>rock : dark brownish grey<br>powder : light grey (light brown tone)<br>origin : Jamestown, Boulder county, Colorado, United States<br><br>production process:<br>2 g of cerite + 2 g of sodium carbonate / 0↑1300 °F + 1 h at 1300 °F (brownish beige [with blue particles]) / irradiated with electrons at 302,831 rad[36] |
| | | mineral : calcite<br>rock : light pink<br>powder : pinkish white |

1149

| | | |
|---|---|---|
| brownish beige a bit darker than «brownish beige» | 6191 | origin : Huddersfield district, Pontiac county, Québec<br><br>production process:<br>1 g of calcite + 1 g of sodium carbonate / 1700 °F / 1 h (green) / irradiated with gamma rays at 65.65 Mrad<br>(followed at «light creamy yellow») |
| | | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>0↑1900 °F (dark iron-grey): 1 g + 50 ml sulphuric acid / soaking: 2 wk. / drying on hot plate (beige [with a few grey particles]) / irradiated with gamma rays at: |
| brownish beige darker than «brownish beige» ↓ | 6192 | 70.4 Mrad |
| brownish beige still darker and more brown | 6193 | 430.4 Mrad |
| brownish beige a bit more pale than «medium brownish beige» | 6194 | mineral : olivine<br>rock : light grey, crystalline<br>powder : very light grey<br>origin : Mont Albert, Gaspésie, Québec<br><br>mineral : sulphur<br>rock : brilliant yellow<br>powder : brilliant yellow<br>origin : unknown<br><br>production process:<br>2 g of olivine + 2 g of sulphur / 1300 °F / 1 h (medium orange-beige) / irradiated with electrons at 302,831 rad[36] |
| brownish beige [between «light brownish beige» and «medium | 6195 | mineral : apatite<br>rock : reddish brown<br>powder : light pinkish beige<br>origin : Calumet, Pontiac county, Québec<br>production process:<br>powder irradiated with electrons at 302,831 rad[36] |

| | | |
|---|---|---|
| brownish beige»] | | |
| brownish beige [between «light brownish beige» and «medium brownish beige»] | 6196 | mineral : fluorescent calcite<br>rock : white (localized grey or brown reflection), translucid<br>powder : white (yellow reflection)<br>origin : Bancroft, Ontario<br><br>production process:<br>(followed from «light cream [light orange tone]») 2 g of calcite + 2.50 g of sodium carbonate / 1700 °F / 1 h (emerald-green) / irradiated with electrons at 302,831 rad[45] |
| brownish beige [between «light brownish beige» and «medium brownish beige»] | 6197 | mineral : calcite<br>rock : light pink<br>powder : pinkish white<br>origin : Huddersfield district, Pontiac county, Québec<br><br>production process:<br>(followed from «cream a bit darker than "light cream"») 2 g of calcite + 2 g of sodium carbonate / 0↑1600 °F + 1 h at 1600 °F (cream a bit darker than «very light cream») / irradiated with electrons at 302,831 rad |
| brownish beige [between «light brownish beige» and «medium brownish beige»] | 6198 | mineral : steatite<br>rock : light evergreen<br>powder : white<br>origin : East Broughton, Québec<br><br>production process:<br>2 g of steatite + 2 g of sodium carbonate / 0↑1300 °F + 1 h at 1300 °F (very light beige [very light orange tone]) / irradiated with electrons at 302,831 rad[36] |
| brownish beige a bit darker than «brownish beige | 6199 | mineral : fluorescent calcite<br>rock : white (localized grey or brown reflection), translucid<br>powder : white (yellow reflection)<br>origin : Bancroft, Ontario<br><br>production process:<br>2 g of calcite + 2 g of sodium carbonate / 0↑1300 °F + 1 h at 1300 °F (brownish beige [orange-pink tone], between «light brownish beige [orange |

| | | |
|---|---|---|
| [between "light brownish beige" and "medium brownish beige"]» | | -pink tone]» and «medium brownish beige [orange-pink tone]») / irradiated with electrons at 162,431 rad (followed at «medium orange-beige») |
| medium brownish beige | 6200 | mineral : actinolite<br>rock : cold and light evergreen<br>powder : light grey (light green tone)<br>origin : erratic block found at Saint-Philémon near Dorchester, Québec<br><br><u>production process:</u><br>(followed from «orange-beige»)<br>2 g of actinolite + 2 g of sodium carbonate / 0↑1500 °F + 1 h at 1500 °F (beige [very light orange tone]) / irradiated with gamma rays at 424.7 Mrad |
| medium brownish beige | 6201 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>2 g of asbestos + 2 g of sodium carbonate / 0↑1400 °F + 1 h at 1400 °F (light orange-chamois) / irradiated with gamma rays at 550.22 Mrad[535] |
| medium brownish beige | 6202 | mineral : andulusite<br>rock : light brownish grey<br>powder : light grey<br>origin : Bimbowrie, South Australia<br><br><u>production process:</u><br>(followed from «light cold beige»)<br>2 g of andulusite + 2 g of sodium carbonate / 0↑1300 °F + 1 h at 1300 °F (light orange-beige) / irradiated with gamma rays at 423.88 Mrad |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white |

1152

| | | |
|---|---|---|
| medium brownish beige | 6203 | <u>production process:</u><br>0↑1400 °F / slow cooling in furnace (indian red[107]): .10 g + .50 g of feldspar (dark reddish brown): 1 g + 4.50 g of cement[1138] + 3 cc of water / manual grinding / moulding / hardening / 0↑1900 °F<br>(followed at «dark greyish beige [light orange tone]») |
| medium brownish beige | 6204 | mineral : sandstone<br>rock : medium pinkish brown (light violet tone)<br>powder : medium pinkish brown (light violet tone)<br>origin : at the rear of Percé, Gaspésie, Québec<br><u>production process:</u><br>(followed from «light beige [very light orange tone]»)<br>2 g of sandstone + 2 g of sodium carbonate / 0↑1500 °F + 15 min. at 1500 °F (orange) / irradiated with gamma rays at 424.7 Mrad |
| medium brownish beige | 6205 | mineral : serpentine<br>rock : yellowish green<br>powder : light greenish yellow<br>origin : probably Thetford Mines, Eastern Townships, Québec<br><u>production process:</u><br>(followed from «pinkish beige a bit more accentuated than "light pinkish beige"»)<br>3 g of serpentine + 20 ml hydrofluoric acid / soaking: 24 h / drying in oven at 100 °F (very, very light yellowish beige) / irradiated with gamma rays at 424.7 Mrad |
| medium brownish beige | 6206 | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><u>production process:</u><br>1 g of vesuvianite + 1 g of sulphur / 1700 °F / 1 h (grey) / irradiated with gamma rays at 65.65 Mrad<br>(followed at «medium orange-brown») |
| | | mineral : vesuvianite<br>rock : lilac<br>powder : lilac |

| | | |
|---|---|---|
| medium brownish beige, mat | 6207 | origin : John Mansville Mine, Asbestos, Québec<br><br>production process:<br>0↑1600 °F (light beige): 2 g + 40 ml nitric acid / soaking: 1 wk. / drying on hot plate |
| dark brownish beige | 6208 | mineral : amazonite<br>rock : light greenish turquoise<br>powder : white (turquoise reflection)<br>origin : Lac Sairs, Témiscamingue, Québec<br><br>mineral : sulphur<br>rock : brilliant yellow<br>powder : brilliant yellow<br>origin : unknown<br><br>production process:<br>1 g of amazonite + 2 g of sodium carbonate + 1 g of sulphur / 1600 °F / 1 h |
| fairly dark brownish beige | 6209 | mineral : orthoclase<br>rock : white (grey reflection)<br>powder : white (grey reflection)<br>origin : mine near Buckingham, Papineau county, Québec<br><br>production process:<br>rock hermetically wrapped in bread dough / 1600 °F / 1 h (white [beige and grey reflections]) / the rock is removed from the paste and irradiated with gamma rays at 64.7 Mrad |
| dark brownish beige | 6210 | mineral : anorthosite<br>rock : dark grey<br>powder : medium grey<br>origin : Jonquière, Lac Saint-Jean, Québec<br><br>production process:<br>1500 °F / 1 h |
| dark brownish beige or light brown | 6211 | mineral : fluorescent calcite<br>rock : white (localized grey or brown reflection), translucid<br>powder : white (yellow reflection)<br>origin : Bancroft, Ontario<br><br>production process:<br>1000 °C / 1 h |
| dark brownish beige | 6212 | production process:<br>0↑1000 °C |

| | | |
|---|---|---|
| or light brown | | |
| dark brownish beige | 6213 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «medium pinkish brown»)<br>powder irradiated with gamma rays at 360 Mrad |
| dark brownish beige | 6214 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «orange-beige»)<br>25 g of quartz - mica + 100 ml nitric acid / soaking: 5 months / natural drying (light orange-beige) / irradiated with gamma rays at 424.7 Mrad |
| dark brownish beige | 6215 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «yellowish beige»)<br>3 g of ochre + 20 ml hydrofluoric acid / soaking: 24 h / drying in oven at 100 °F (medium brownish grey) / irradiated with gamma rays at 424.7 Mrad |
| dark brownish beige | 6216 | production process:<br>(followed from «yellowish beige»)<br>10 g of ochre + 100 ml hydrochloric acid / soaking: 1 wk. / drying on hot plate (medium yellowish cream [light orange tone]) / irradiated with gamma rays at 424.7 Mrad |
| | | mineral : nickeliferous pyrrhotite[23]<br>rock : dark iron-grey, with silver and golden yellow metallic brilliance<br>powder : dark iron-grey |

| | | |
|---|---|---|
| dark brownish beige | 6217 | origin : Inco Co., Sudbury, Ontario<br><br>production process:<br>(followed from «straw-yellow [green tone]»)<br>4 g of pyrrhotite + 20 ml nitric acid / soaking: 3 d. / drying on hot plate (light orange-yellow ochre [green reflection]) / irradiated with gamma rays at 424.7 Mrad |
| brownish beige a bit darker than «dark brownish beige» | 6218 | mineral : tremolite<br>rock : medium brown (evergreen tone)<br>powder : greyish beige<br>origin : Tetreault Mine, Montauban, Portneuf county, Québec<br><br>production process:<br>(followed from «pinkish beige»)<br>0↑2000 °F (dark beige [orange tone]) / powder irradiated with gamma rays at 424.7 Mrad[724] |
| | | production process:<br>powder irradiated with gamma rays at: |
| greyish beige | 6219 | 5 Mrad |
| which becomes | 6220 | 10 Mrad |
| more and more | 6221 | 57.4 Mrad |
| | 6222 | 102.4 Mrad |
| brown | 6223 | 148.4 Mrad |
| and dark and | 6224 | 190.22 Mrad |
| which evolves | 6225 | 201.6 Mrad |
| towards the | 6226 | 247.6 Mrad |
| | 6227 | 287.3 Mrad |
| ↓ | 6228 | 360 Mrad |
| dark brownish beige | 6229 | 550.22 Mrad[725] |
| mixture of particles | | |
| medium brownish beige / medium grey / pale grey / white | 6230 | mineral : amazonite<br>rock : light greenish turquoise<br>powder : white (turquoise reflection)<br>origin : Lac Sairs, Témiscamingue, Québec<br><br>production process:<br>(followed from «brownish beige»)<br>2 g of amazonite + 2 g of sodium carbonate / 0↑1500 °F + 1 h at 1500 °F (grey a bit darker than «very, very light grey [almost white]») / irradiated with gamma rays at 424.7 Mrad |
| brownish beige (greenish blue tone) | | |
| | | mineral : bauxite[92]<br>powder : pinkish beige, mat<br>origin : Alcan Company, French Guyana |

1156

| | | |
|---|---|---|
| light brownish beige (localized light greenish blue tone) | 6231 | mineral : sulphur<br>rock : brilliant yellow<br>powder : brilliant yellow<br>origin : unknown<br><br>mineral : cement[1138]<br>powder : white<br><br>production process:<br>1 g of bauxite + 1 g of sulphur + 27.40 g of cement + 13 cc of water / manual grinding / moulding / hardening / 0↑1900 °F[708] |
| light brownish beige (localized light greenish blue tone) | 6232 | production process:<br>1 g of bauxite + 1 g of sulphur + 1 g of potassium carbonate + 27.40 g of cement + 13 cc of water / manual grinding / moulding / hardening / 0↑1900 °F[708] |
| brownish beige (green tone) | | |
| light brownish beige (very light green tone) | 6233 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br>production process:<br>(followed from «medium beige [very light green tone]»)<br>5 g of iron sulphide - nickel + 15 ml hydrochloric acid + 10 ml water / soaking: 3 d. / drying on hot plate (apple-green less vivid than «vivid apple-green») / irradiated with electrons at 302,831 rad[45] |
| brownish beige (green tone) | 6234 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «cream [light orange tone]»)<br>2 g of molybdenite + 2 g of sodium carbonate / 1300 °F / 1 h |
| | | mineral : galena<br>rock : dark grey, with metallic brilliance |

| | | |
|---|---|---|
| dark brownish beige (light green tone) | 6235 | powder : dark grey, with metallic brilliance<br>origin : Trail, British Columbia<br><br>production process:<br>2 g of galena + 2 g of sodium carbonate / 1100 °F / 1 h<br>(followed at «medium beige [light green tone]») |
| brownish beige (orange tone) | | |
| light brownish beige (orange reflection) | 6236 | mineral : anorthosite<br>rock : dark grey<br>powder : medium grey<br>origin : Jonquière, Lac Saint-Jean, Québec<br><br>production process:<br>2 g of anorthosite + 2 g of sodium carbonate / 0↑1400 °F + 1 h at 1400 °F (light chamois) / irradiated with electrons at 302,831 rad[36] |
| brownish beige (orange reflection) | 6237 | mineral : asbestos[4]<br>rock : dark grey (green reflection)<br>powder : light grey (green reflection)<br>origin : Asbestos Corporation Ltd., Thetford Mines, Québec<br><br>production process:<br>2 g of asbestos + 2 g of sodium carbonate / 0↑1700 °F + 1 h at 1700 °F (orange-chamois) / irradiated with gamma rays at 190.22 Mrad<br>(followed at «medium milky chocolate-brown [pink tone]») |
| brownish beige (light orange tone) | 6238 | mineral : dolomite<br>rock : white (localized yellow reflection), crystalline and translucid<br>powder : white<br>origin : Bristol district, Pontiac county, Québec<br><br>production process:<br>2 g of dolomite + 2 g of sodium carbonate / 0↑1500 °F + 1 h at 1500 °F (orange) / irradiated with gamma rays at 64.7 Mrad<br>(followed at «medium beige») |
| | | mineral : halite[41]<br>rock : colourless<br>powder : colourless<br>origin : Seleine Mine, Iles-de-la-Madeleine, Québec |

| | | |
|---|---|---|
| brownish beige (orange tone) | 6239 | mineral : sulphur<br>rock : brilliant yellow<br>powder : brilliant yellow<br>origin : unknown<br><br>production process:<br>2 g of halite + 2 g of sulphur / 1300 °F / 1 h (light beige) / irradiated with gamma rays at 64.7 Mrad[704]<br>(followed at «dark brownish beige [orange tone]») |
| | | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «beige [pinkish brown tone]»)<br>2 g of ochre + 1 g of titanium dioxide: |
| brownish beige (light orange tone) | 6240 | 0↑1600 °F |
| ↓ | | |
| brownish beige (orange tone a bit more accentuated) | 6241 | 0↑1650 °F |
| ↓ | | |
| more brown brownish beige | 6242 | 0↑1700 °F<br>(followed at «pale orange-brown») |
| | | mineral : serpentine<br>rock : yellowish green<br>powder : light greenish yellow<br>origin : probably Thetford Mines, Eastern Townships, Québec<br><br>production process:<br>0↑2200 °F (medium orange-beige) / powder irradiated with gamma[239] rays at: |
| brownish beige (light orange tone) | 6243 | 64.7 Mrad |
| ↓ | | |
| still darker brownish beige (light orange tone) | 6244 | 424.7 Mrad |
| | | mineral : hornblende<br>rock : medium evergreen (light grey tone), with a vitreous brilliance<br>powder : medium cold grey (light green tone) |

1159

| | | |
|---|---|---|
| medium brownish beige (very light orange reflection) | 6245 | origin : Abitibi, Québec<br><br>production process:<br>0↑2000 °F (dark orange-beige) / powder irradiated with electrons at 302,831 rad[36] |
| medium brownish beige (light orange reflection) | 6246 | mineral : magnetite<br>rock : dark grey, with metallic brilliance<br>powder : dark grey<br>origin : Fosse du Labrador, Québec<br><br>production process:<br>3 g of magnetite + 80 ml sulphuric acid / soaking: 2 wk. / drying on hot plate (dark brown) / irradiated with gamma rays at 430.4 Mrad[239] |
| brownish beige (light orange tone) a bit darker than «medium brownish beige (orange tone)» | 6247 | mineral : cerite<br>rock : dark brownish grey<br>powder : light grey (light brown tone)<br>origin : Jamestown, Boulder county, Colorado, United States<br><br>mineral : sulphur<br>rock : brilliant yellow<br>powder : brilliant yellow<br>origin : unknown<br>production process:<br>2 g of cerite + 2 g of sulphur / 1300 °F / 1 h (medium brownish beige [light orange tone]) / irradiated with gamma[239] rays at:<br>64.7 Mrad |
| ↓<br>still darker brownish beige (light orange tone) | 6248 | 424.7 Mrad[727] |
| medium brownish beige (light orange tone) | 6249 | production process:<br>2 g of cerite + 2 g of sulphur / 1300 °F / 1 h |
| | | mineral : olivine<br>rock : light grey, crystalline<br>powder : very light grey<br>origin : Mont Albert, Gaspésie, Québec<br>production process:<br>(followed from «orange-beige») |

| | | |
|---|---|---|
| brownish beige a bit darker (orange reflection) | 6250 | <u>production process:</u><br>2 g of olivine + 2 g of sodium carbonate / 0↑1200 °F + 1 h at 1200 °F (medium orange-beige) / irradiated with gamma rays at 423.88 Mrad |
| brownish beige (orange tone) a bit more accentuated and dark than «medium brownish beige (orange tone)» | 6251 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>2 g of molybdenite + 2 g of sodium carbonate / 0↑800 °F + 1 h at 800 °F (medium brownish beige [pink tone]) / irradiated with gamma rays at 423.88 Mrad |
| dark brownish beige (orange tone) | 6252 | mineral : halite[41]<br>rock : colourless<br>powder : colourless<br>origin : Seleine Mine, Iles-de-la-Madeleine, Québec<br><br>mineral : sulphur<br>rock : brilliant yellow<br>powder : brilliant yellow<br>origin : unknown<br><u>production process:</u><br>(followed from «brownish beige [orange tone]»)<br>2 g of halite + 2 g of sulphur / 1300 °F / 1 h (light beige) / irradiated with gamma rays at 424.7 Mrad |
| dark brownish beige (light orange tone) | 6253 | mineral : diopside<br>rock : light grey<br>powder : light beige<br>origin : Mont Orford, Québec<br><br>mineral : sulphur<br>rock : brilliant yellow<br>powder : brilliant yellow<br>origin : unknown<br><u>production process:</u><br>(followed from «medium orange-beige»)<br>2 g of diopside + 2 g of sulphur / 1300 °F / 1 h (medium orange-beige) / irradiated with gamma rays at 424.7 Mrad[728] |
| brownish beige (pink tone) | | |

| | | |
|---|---|---|
| light brownish beige (light pink tone) | 6254 | mineral : cement[82]<br>powder : medium cold grey<br>origin : Union des Carrières, Limoilou, Québec<br><br>production process:<br>2 g of cement + 2 g of sodium carbonate / 0↑1500 °F + 1 h at 1500 °F (light beige [light orange tone]) / irradiated with electrons at 302,831 rad[36] |
| light brownish beige (light pink tone) | 6255 | mineral : ochre[128]<br>powder : black<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br>production process:<br>(followed from «light greyish beige [pink tone]») 1 g of ochre + 1 g of zirconium silicate + 1 g of titanium dioxide / 0↑1600 °F<br>(followed at «light brownish beige») |
| brownish beige (very light pink tone) darker than «light brownish beige (pink tone)» | 6256 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>mineral : sulphur<br>rock : brilliant yellow<br>powder : brilliant yellow<br>origin : unknown<br>production process:<br>2 g of apatite + 2 g of sulphur / 1300 °F / 1 h (light beige [light pink tone]) / irradiated with electrons at 302,831 rad[36] |
| | | mineral : ochre[128]<br>powder : black<br>origin : Red Mill, in the suburbs of Cap-de-la-Madeleine, Québec |

1162

| | | |
|---|---|---|
| brownish beige (pink tone) | 6257 | mineral : titanium dioxide<br>powder : white<br>origin : NL Chem Canada Inc., Québec<br><br>production process:<br>(followed from «pinkish beige [grey tone]»)<br>1 g of ochre + 1 g of titanium dioxide /<br>0↑1600 °F<br>(followed at «brownish beige») |
| brownish beige (pink tone) darker than «brownish beige (pink tone)»<br>↓ | 6258 | production process:<br>(followed from «brownish beige [grey tone]»)<br>2 g of ochre + 1 g of titanium dioxide:<br>0↑1300 °F |
| brownish beige (accentuated pink tone) | 6259 | 0↑1500 °F<br>(followed at «orange-beige») |
| brownish beige (pink tone) | 6260 | mineral : fluorescent calcite<br>rock : white (localized grey or brown reflection), translucid<br>powder : white (yellow reflection)<br>origin : Bancroft, Ontario<br>production process:<br>2 g of calcite + 2 g of sodium carbonate /<br>0↑1300 °F + 1 h at 1300 °F (brownish beige [light orange-pink tone], between «light brownish beige [orange-pink tone]» and «medium brownish beige [orange-pink tone]») / irradiated with gamma rays at 64.7 Mrad<br>(followed at «medium beige») |
| brownish beige (pink tone) [between «light brownish beige (pink tone)» and medium | 6261 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br>production process:<br>2 g of iron sulphide - nickel + 2 g of sodium carbonate / 0↑1800 °F + 1 h at 1800 °F (mixture of particles: orange / green / brown) / irradiated with gamma rays at:<br>63.88 Mrad |

| | | |
|---|---|---|
| brownish beige (pink tone)»] ↓ medium brownish beige (pink reflection) | 6262 | 423.88 Mrad |
| brownish beige (pink tone) a bit more pale than «medium brownish beige (pink tone)» | 6263 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br>production process:<br>2 g of molybdenite + 2 g of sodium carbonate / 0↑800 °F + 1 h at 800 °F (medium brownish beige [pink tone]) / irradiated with electrons at 302,831 rad[45] |
| medium brownish beige (pink reflection) | 6264 | mineral : apatite<br>rock : reddish brown<br>powder : light pinkish beige<br>origin : Calumet, Pontiac county, Québec<br>production process:<br>powder irradiated with gamma rays at 64.7 Mrad (followed at «medium salmon [light brown tone]») |
| medium brownish beige (light pink tone) | 6265 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white<br>production process:<br>(followed from «medium greyish brown [light pinkish orange tone]»)<br>0↑1400 °F / slow cooling in furnace (indian red[107]): .25 g + 1 g of feldspar (dark brown [orange-pink tone]): 1 g + 4.50 g of cement + 3 cc of water / manual grinding / moulding / hardening / 0↑1900 °F[708]<br>(followed at «dark milky chocolate-brown [light pinkish orange tone]») |
| | | mineral : molybdenite[103] |

| | | |
|---|---|---|
| medium brownish beige (pink tone) | 6266 | rock : medium grey, with metallic brilliance<br>powder : medium grey, with metallic brilliance<br>origin : Anglo American Molybdenite Mine, near Lamotte, Preissiac district, Abitibi, Québec<br><u>production process:</u><br>2 g of molybdenite + 2 g of sodium carbonate / 0↑800 °F + 1 h at 800 °F<br>(followed at «light greenish yellow or light yellowish green») |
| brownish beige (light pink tone) darker and more brown than «medium brownish beige (pink tone)» | 6267 | mineral : anorthosite<br>rock : dark grey<br>powder : medium grey<br>origin : Jonquière, Lac Saint-Jean, Québec<br><u>production process:</u><br>(followed from «orange-beige [grey and pink tones]»)<br>2 g of anorthosite + 2 g of sodium carbonate / 0↑1400 °F + 1 h at 1400 °F (light chamois) / irradiated with gamma rays at 424.7 Mrad |
| brownish beige (light pink reflection) much darker than «medium brownish beige (pink tone)» | 6268 | mineral : granite gneiss<br>rock : reddish beige<br>powder : medium pink (light brown tone)<br>origin : Lac Beauport, region of the city of Québec, Québec<br><u>production process:</u><br>0↑2000 °F (medium beige [light pink reflection]) / powder irradiated with gamma rays at 64.7 Mrad<br><br>(followed at «dark greyish beige [light orange reflection]») |
| dark brownish beige (pink tone) | 6269 | mineral : asbestos[4]<br>rock : dark grey (green reflection)<br>powder : light grey (green reflection)<br>origin : Asbestos Corporation Ltd., Thetford Mines, Québec<br>mineral : sulphur<br>rock : brilliant yellow<br>powder : brilliant yellow<br>origin : unknown<br><u>production process:</u><br>(followed from «chamois»)<br>50 g of asbestos + 200 ml hydrochloric acid <u>or</u> asbestos entirely covered with hydrochloric acid / soaking: 1 wk. / drying on hot plate (vivid yellow): .50 g + .50 g of sulphur (light yellowish green) / 1700 °F / 1 h |

1165

| | | |
|---|---|---|
| dark brownish beige (pink tone) | 6270 | mineral : sphalerite[27]<br>rock : dark grey, golden yellow metallic brilliance<br>powder : dark brownish grey<br>origin : Matagami Mine, Matagami, Québec<br>production process:<br>(followed from «light orange-yellow [light pink tone]»)<br>0↑1800 °F (medium chocolate-brown): 1 g + 50 ml sulphuric acid / soaking: 2 wk. / drying on hot plate (white) / irradiated with gamma rays at 424.7 Mrad |
| brownish beige (orange-pink tone) | | |
| light brownish beige (orange-pink tone) | 6271 | mineral : zincite<br>rock : mixture of areas: dark grey / orange-red<br>powder : medium milky chocolate-brown (red tone)<br>origin : Franklin, New Jersey, United States<br>production process:<br>(followed from «light yellowish cream [very light orange tone]»)<br>4 g of zincite + 50 ml sulphuric acid / soaking: 2 wk. / drying on hot plate (creamy white [light orange reflection]) / irradiated with gamma rays at 424.7 Mrad |
| brownish beige (orange-pink or pinkish orange reflection) darker and more brown than «light brownish beige (orange-pink or pinkish orange tone)» | 6272 | mineral : granite gneiss<br>rock : reddish beige<br>powder : medium pink (light brown tone)<br>origin : Lac Beauport, region of the city of Québec, Québec<br><br>mineral : sulphur<br>rock : brilliant yellow<br>powder : brilliant yellow<br>origin : unknown<br>production process:<br>(followed from «chamois [orange-pink tone]»)<br>2 g of gneiss + 2 g of sulphur / 1300 °F / 1 h (light chamois [orange-pink tone]) / irradiated with gamma rays at 424.7 Mrad |
| | | mineral : fluorescent calcite<br>rock : white (localized grey or brown reflection), translucid |

| | | |
|---|---|---|
| | | powder : white (yellow reflection)<br>origin : Bancroft, Ontario<br><u>production process:</u><br>(followed from «beige»)<br>2 g of calcite + 2 g of sodium carbonate: |
| brownish beige (light orange-pink tone) [between «light brownish beige (orange-pink tone)» and «medium brownish beige (orange-pink tone)»]<br>↓ | 6273 | 0↑1300 °F + 1 h at 1300 °F |
| brownish beige (light orange-pink tone [between «light brownish beige (orange-pink tone)» and «medium brownish beige (orange-pink tone)»] | 6274 | 0↑1400 °F + 1 h at 1400 °F<br><br>(followed at «white [light green reflection]») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : sulphur<br>rock : brilliant yellow<br>powder : brilliant yellow<br>origin : unknown<br><u>production process:</u><br>(followed from «dark beige [pinkish orange tone]») |
| brownish beige (orange-pink tone) more pale than «medium brownish beige (orange-pink tone)» | 6275 | 2 g of molybdenite + 2 g of sulphur / 1300 °F / 1 h (Naples yellow [green tone]) / irradiated with electrons at 302,831 rad[45] |
| brownish beige (copper tone) | | |
| | | mineral : steatite<br>rock : cold light grey, slightly translucid<br>powder : light grey<br>origin : East Broughton, Québec<br><u>production process:</u><br>(followed from «copper-beige [orange-pink tone]»)<br>rock measuring 1/2" x 4 7/8" x 1/8", weighing 15 g |

| | | |
|---|---|---|
| brownish beige (copper tone)<br>↓ | 6276 | and heated at:<br>0↑2100 °F[729] |
| brownish beige (copper tone) still more brown and «copper tone» less accentuated | 6277 | 0↑2200 °F<br>(followed at «beige [orange-pink tone]») |
| brownish beige (grey tone) | | |
| beige (greyish brown tone) a bit more pale than «light beige (greyish brown tone)» | 6278 | mineral : orthoclase<br>rock : white (grey reflection)<br>powder : white (grey reflection)<br>origin : mine near Buckingham, Papineau county, Québec<br><br>mineral : sulphur<br>rock : brilliant yellow<br>powder : brilliant yellow<br>origin : unknown<br>production process:<br>2 g of orthoclase + 2 g of sulphur / 1300 °F / 1 h (light beige [light pink tone]) / irradiated with electrons at 302,831 rad[36] |
| light brownish beige (light grey tone) | 6279 | mineral : antigorite<br>rock : pale yellowish green<br>powder : very pale greenish yellow<br>origin : Canadian Refractories Mine, Kilmar, Québec<br>production process:<br>2 g of serpentine + 2 g of sodium carbonate / 0↑1300 °F + 1 h at 1300 °F<br>(followed at «beige [light orange tone] lighter than "light orange-beige"») |
| light brownish beige (grey tone) | 6280 | mineral : microcline<br>rock : white (grey reflection)<br>powder : white (grey reflection)<br>origin : Buckingham, Québec<br>production process:<br>(followed from «beige»)<br>0↑1900 °F (light grey): .50 g + 50 ml nitric acid / soaking: 2 wk. / drying on hot plate (white [light beige reflection]) / irradiated with gamma rays at 424.7 Mrad |
| | | mineral : iron sulphide - nickel[353] |

| | | |
|---|---|---|
| brownish beige (grey tone) much more pale than «brownish beige (grey tone)» | 6281 | rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «orange-beige darker than "pale orange-beige»)<br>2 g of iron sulphide - nickel + 2 g of sodium carbonate / 0↑1400 °F + 1 h at 1400 °F (pale mossy green) / irradiated with gamma rays at 424.7 Mrad |
| brownish beige (grey tone) | 6282 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>2 g of ochre + 1 g of titanium dioxide / 0↑1000 °F<br>(followed at «brownish beige [pink tone]») |
| brownish beige (grey tone) | 6283 | mineral : tremolite<br>rock : medium brown (evergreen tone)<br>powder : greyish beige<br>origin : Tetreault Mine, Montauban, Portneuf county, Québec<br>production process:<br>2 g of tremolite + 2 g of potassium carbonate / 0↑1500 °F<br>(followed at «grass-green») |
| medium brownish beige (grey tone) | 6284 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br>production process:<br>1300 °F / 1 h (very light beige [light pinkish orange tone]) / irradiated with gamma rays at 424.7 Mrad[81] |
| | | mineral : sericite shale |

1169

| | | |
|---|---|---|
| medium brownish beige (light grey tone) | 6285 | rock : light grey (green reflection)<br>powder : very, very light grey<br>origin : Magog, Québec<br>production process:<br>(followed from «beige [orange-pink tone]»)<br>2 g of shale + 2 g of sodium carbonate / 0↑1500 °F + 15 min. at 1500 °F (light beige [very light orange tone]) / irradiated with gamma rays at 424.7 Mrad |
| brownish beige (grey tone) darker than «medium brownish beige (grey tone)» | 6286 | mineral : dolomite<br>rock : light grey<br>powder : light grey<br>origin : Shefferville, Ungava, Québec<br><br>mineral : sulphur<br>rock : brilliant yellow<br>powder : brilliant yellow<br>origin : unknown<br>production process:<br>2 g of dolomite + 2 g of sulphur / 1300 °F / 1 h (medium orange-beige) / irradiated with gamma rays at 424.7 Mrad[81] |
| dark brownish beige (grey tone) | 6287 | mineral : barite<br>rock : pinkish white<br><br>powder : white<br>origin : Niobec Mine, Saint-Honoré, Saguenay, Québec<br>production process:<br>(followed from «mixture of particles: blue / pink»)<br>0↑1900 °F (greyish beige [pink reflection) / irradiated with gamma rays at 424.7 Mrad |
| dark brownish beige (grey tone) | 6288 | mineral : bauxite[92]<br>powder : pinkish beige, mat<br>origin : Alcan Company, French Guyana<br><br>mineral : cement[1138]<br>powder : white<br>production process:<br>(followed from «dark beige [orange-pink tone]»)<br>5 g of bauxite + 27.40 g of cement + 13 cc of water / manual grinding / moulding / hardening / 0↑1900 °F |
| | | mineral : steatite<br>rock : light evergreen<br>powder : white<br>origin : East Broughton, Québec |

| | | |
|---|---|---|
| dark brownish beige (grey tone) | 6289 | <u>production process:</u><br>(followed from «orange-beige darker than "light orange-beige"»)<br>3 g of steatite + 25 ml hydrochloric acid / soaking: 3 d. / drying on hot plate (light orange-beige) / irradiated with gamma rays at 423.88 Mrad |
| dark brownish beige (grey tone) | 6290 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><u>production process:</u><br>(followed from «cream [brown tone] darker than "dark cream [brown tone]"»)<br>6 g of molybdenite + 50 ml nitric acid / soaking: 2 wk. / drying on hot plate (dark cream) / irradiated with gamma rays at 424.7 Mrad[239] |
| very dark brownish beige (grey tone) | 6291 | <u>production process:</u><br>(followed from «medium orange-beige»)<br>5 g of molybdenite + 50 ml hydrochloric acid / soaking: 2 wk. / drying on hot plate (light cream) / irradiated with gamma rays at 424.7 Mrad[239] |
| brownish beige (grey and pink tones) | | |
| pale brownish beige (grey and pink reflections) | 6292 | mineral : andulusite<br>rock : light brownish grey<br>powder : light grey<br>origin : Bimbowrie, South Australia<br><u>production process:</u><br>0†1900 °F (light beige): 1 g + 50 ml hydrochloric acid / soaking: 2 wk. / drying on hot plate (medium beige [light orange tone]) / irradiated with electrons at 302,831 rad[36] |
| very light brownish beige (very light grey and pink tones) | 6293 | mineral : pyrophillite<br>rock : light beige (grey and pink tones), opaque<br>powder : very light beige (grey and orange-pink tones)<br>origin : Carpentier district, Abitibi, Québec<br><u>production process:</u><br>powder irradiated with electrons at 302,831 rad[36] |

1171

| | | |
|---|---|---|
| | | mineral : beryl<br>rock : very light yellowish green, slightly translucid<br>powder : white (green reflection)<br>origin : Lacorne district, Abitibi, Québec |
| medium brownish beige (grey and pink tones) | 6294 | production process:<br>2 g of beryl + 2 g of sodium carbonate /<br>0↑1300 °F + 1 h at 1300 °F<br>(followed at «creamy beige») |
| brownish beige (grey and pink tones) much darker than «medium brownish beige» (grey and pink tones)» | 6295 | production process:<br>2 g of beryl + 2 g of sodium carbonate /<br>0↑1300 °F + 1 h at 1300 °F (medium brownish beige [grey and pink tones]) / irradiated with gamma rays at 64.7 Mrad<br>(followed at «greyish beige [light green tone]») |

BROWN (BEIGE TONE)

| colour obtained | number | mineral / production process |
|---|---|---|
| brown (chamois tone) | | |
| brown (chamois tone) | 6296 | mineral : crocidolite<br>rock : dark greyish blue<br>powder : pale greyish blue<br>origin : Griqualand district, South Africa<br><br>production process:<br>(followed from «chocolate-brown»)<br>250 g of asbestos + 1650 ml hydrochloric acid in a 2000 ml becher or asbestos entirely covered with hydrochloric acid in a vertical container / soaking: 1 wk. / drying on hot plate (formation of 2 layers of superimposed colours, the one at the bottom being: dark green [light yellow tone]) / 1000 °F / 1 h<br>(followed at «dark rusty orange») |
| brown (chamois tone) | 6297 | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br>production process:<br>(followed from «pinkish brown»)<br>250 g of asbestos + 1650 ml hydrochloric acid in a 2000 ml becher or asbestos entirely covered with hydrochloric acid in a vertical container / soaking: 1 wk. / drying on hot plate (formation of 2 layers of superimposed layers of colours, the one at the bottom being: dark green [light yellow tone]): 2 g + 2 g of sulphur / 1000 °F / 1 h[730]<br>(followed at «dark brown [violet-red tone]») |
| | | mineral : bauxite[92] |

1173

| | | |
|---|---|---|
| brown (chamois tone) lighter than «medium brown (chamois tone)» | 6298 | powder : pinkish beige, mat<br>origin : Alcan Company, French Guyana<br><br>production process:<br>0↑1400 °F (pinkish chamois lighter than at 1300 °F): 3 g + 25 ml nitric acid / soaking: 3 d. / drying on hot plate (light chamois [beige tone]): .3 g + 50 cc of transparent polyester resin + 1% of catalyst / manual grinding / moulding / hardening (medium orange [brown tone]) / irradiated with electrons at 155,082 rad (followed at «orange-brun») |
| brown (beige tone) | | |
| brown (beige tone) | 6299 | mineral : fluorescent calcite<br>rock : white (localized grey or brown reflection), translucid<br>powder : white (yellow reflection)<br>origin : Bancroft, Ontario<br><br>production process:<br>2 g of calcite + 2 g of sodium carbonate / 1300 °F / 1 h |
| medium brown (tends towards beige) | 6300 | mineral : olivine<br>rock : light grey, crystalline<br>powder : very light grey<br>origin : Mont Albert, Gaspésie, Québec<br><br>production process:<br>(followed from «greenish brown [tends towards olive-green]»)<br>2 g of olivine + 2 g of sodium carbonate / 0↑1600 °F + 1 h at 1600 °F<br>(followed at «chocolate-brown») |

BROWN

| colour obtained | number | mineral / production process |
|---|---|---|
| brown (violet tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec |
| whitened brown (violet tone) | 6301 | production process:<br>0↑1400 °F / slow cooling in furnace (indian red[107]): 8 g + 96 g of sulphur / 1500 °F / 1 h (dark violet-brown): .50 g + .50 g of titanium dioxide |
| | | production process:<br>0↑1400 °F / slow cooling in furnace (indian red[107]): 8 g + 96 g of sulphur / 1500 °F / 1 h (dark violet-brown): .50 g + .50 g of titanium dioxide (whitened violet-brown) / irradiated with with gamma[239] rays at: |
| violet-brown lighter than «whitened violet-brown»<br>↓ | 6302 | 63.984 Mrad[731] |
| violet-brown identical to the previous one<br>↓ | 6303 | 242.804 Mrad[731] |
| violet-brown slightly more intense and dark than «whitened violet-brown» | 6304 | 602.804 Mrad |

| | | |
|---|---|---|
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>(followed from «reddish chocolate-brown» and «medium chocolate-brown») |
| brown (light violet tone) | 6305 | 2 g of goethite + 2 g of sulphur / 1200 °F / 1 h<br>(followed at «medium chocolate-brown» and at «brown [light red tone]») |
| | | <u>production process:</u><br>(followed from «dark brown [violet-red tone] or dark red [violet-brown tone]» and «brown [violet-red tone] more red than "dark brown [violet-red tone]"») |
| indian red (violet tone) which becomes more brown and evolves towards | 6306 | 0↑1400 °F / slow cooling in furnace (indian red[107]): 2 g + 2 g of sulphur / 1400 °F / 1 h |
| | 6307 | 0↑1400 °F / slow cooling in furnace (indian red[107]): 2 g + 6 g of sulphur / 1400 °F / 1 h<br><br>(followed from «brown [violet-red tone] lighter than "dark brown [violet-red tone]"») |
| | 6308 | 0↑1400 °F / slow cooling in furnace (indian red[107]): 2 g + 12 of sulphur / 1400 °F / 1 h<br><br>(followed from «brown [violet-red tone] more red than "dark brown [violet-red tone]"») |
| violet-brown | 6309 | 0↑1400 °F / slow cooling in furnace (indian red[107]): 2 g + 24 g of sulphur / 1400 °F / 1 h |
| violet-brown | 6310 | 0↑1400 °F / slow cooling in furnace (indian red[107]): 2 g + 2 g of sulphur / 1500 °F / 1 h<br><br>(followed at «dark violet [brown tone]») |
| violet-brown darker than | 6311 | 0↑1400 °F / slow cooling in furnace (indian red[107]): 2 g + 6 g of sulphur / 1500 °F / 1 h |

1176

| | | |
|---|---|---|
| «violet-brown» | | (followed at «dark violet [accentuated brown tone]») |
| violet-brown still darker | 6312 | 0↑1400 °F / slow cooling in furnace (indian red[107]): 2 g + 12 g of sulphur / 1500 °F / 1 h<br>(followed at «dark violet [accentuated brown tone]») |
| ↓<br>violet-brown still darker | 6313 | 0↑1400 °F / slow cooling in furnace (indian red[107]): 2 g + 24 g of sulphur / 1500 °F / 1 h (followed at «dark violet [accentuated brown tone]» and at «dark violet [brown tone]») |
| brown (light violet tone) a bit more pale than «dark violet-brown» | 6314 | mineral : goethite[106]<br>powder : rusty orange<br>origin : Red Mill, in the suburbs of Cap-de-la -Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>0↑1400 °F / slow cooling in furnace (indian red[107]): 8 g + 96 g of sulphur / 1500 °F / 1 h (dark violet-brown): .50 g + .50 g of zirconium silicate (dark brown [light violet tone]) / irradiated with gamma[239] rays at 602.804 Mrad[731] |
| violet-brown a bit more brown, less dark than «dark violet-brown» | 6315 | mineral : haematite<br>rock : medium chocolate-brown<br>powder : medium chocolate-brown<br>origin : Nouveau Québec, Québec<br><br>production process:<br>0↑1800 °F (dark violet-brown) / powder irradiated with gamma[239] rays at 64.7 Mrad (followed at «violet-brown [red tone], a bit darker than "dark violet-brown [red tone]"») |
| | | mineral : fluorine<br>rock : colourless, transparent<br>powder : colourless |

| | | |
|---|---|---|
| dark brown (violet reflection) | 6316 | origin : Ohio, United States<br><br>production process:<br>(followed from «violet-grey»)<br>1 g of fluorine + 1 cc of white transparent enamel synthetic paint used for the car / manual grinding / application on a piece of steel sheet used for the car's body measuring 1" x 1" (light greyish cream) / irradiated with gamma rays at 102.4 Mrad (followed at «violet») |
| dark violet-brown | 6317 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «dark brown [violet-red tone] or dark red [violet-brown tone]»)<br>0↑1400 °F / slow cooling in furnace (indian red[107]): 2 g + 6 g of sulphur / 1300 °F / 1 h (followed at «brown [violet-red tone] lighter than "dark brown [violet-red tone]"») |
| dark violet-brown | 6318 | production process:<br>2 g of goethite + 2 g of sulphur / 1400 °F / 1 h |
| dark violet-brown | 6319 | production process:<br>(followed from «violet brown darker than "violet-brown"»)<br>0↑1400 °F / slow cooling in furnace (indian red[107]): 2 g + 96 g of sulphur / 1500 °F / 1 h |
| dark violet-brown | 6320 | production process:<br>.50 g of goethite + .50 g of sulphur / 1600 °F / 1 h |
| dark brown (light violet tone) | 6321 | production process:<br>0↑1400 °F / slow cooling in furnace (indian red[107]): 8 g + 96 g of sulphur / 1500 °F / 1 h (dark violet-brown): .50 g + .50 g of zirconium silicate |
| | | mineral : goethite[106]<br>powder : rusty orange |

| | | |
|---|---|---|
| | | origin : Red Mill, in the suburbs of Cap-de-la-Madeleine, Québec |
| | | mineral : zirconium oxide<br>powder : light beige<br>origin : Tam Ceramic Inc., Québec |
| | | <u>production process:</u><br>(followed from «reddish brown») |
| dark violet-brown | 6322 | 1 g of goethite + .50 g of zirconium oxide / 0↑2000 °F<br>(followed at «dark brownish grey») |
| | | (followed from «reddish brown») |
| dark violet-brown | 6323 | 1 g of goethite + 1 g of zirconium oxide / 0↑2000 °F[732] |
| | | (followed at «brownish grey more grey than "dark brownish grey"») |
| | | (followed from «reddish brown») |
| dark violet-brown | 6324 | 1 g of goethite + 1.50 g of zirconium oxide / 0↑2000 °F[733]<br>(followed at «dark brownish grey much more grey than "dark brownish grey"») |
| | | mineral : haematite<br>rock : medium chocolate-brown<br>powder : medium chocolate-brown<br>origin : Nouveau Québec, Québec |
| | | <u>production process:</u> |
| dark violet-brown | 6325 | 0↑1500 °F |
| ¦ violet | 6326 | 0↑1700 °F |
| ↓ tone | 6327 | 0↑1800 °F |
| becomes more accentuated | 6328 | 0↑1900 °F<br>(followed at «blackish violet or dark violet-grey») |
| | | <u>production process:</u> |
| dark violet-brown | 6329 | 4 g of haematite + 80 ml nitric acid / soaking: 2 wk. / drying on hot plate |
| | | mineral : goethite[106]<br>powder : rusty orange<br>origin : Red Mill, in the suburbs of Cap-de-la-Madeleine, Québec |
| | | mineral : sulphur<br>rock : brilliant yellow<br>powder : brilliant yellow<br>origin : unknown |

| | | |
|---|---|---|
| violet-brown more pronounced (accentuated violet tone) than «dark violet-brown» ↓ | 6330 | production process: (followed from «brown [violet-red tone] more accentuated and darker than "dark brown [violet-red tone]"») 2 g of goethite + 2 g of sulphur / 1400 °F / 1 h (dark violet-brown) / irradiated with gamma[239] rays at: 64.7 Mrad |
| violet-brown darker, more intense and luminous than «dark violet-brown» | 6331 | 424.7 Mrad |
| violet-brown (red tone) | | |
| dark violet-brown (red tone) | 6332 | mineral : goethite[106]<br>powder : rusty orange<br>origin : Red Mill, in the suburbs of Cap-de-la-Madeleine, Québec<br><br>mineral : zirconium oxide<br>powder : light beige<br>origin : Tam Ceramic Inc., Québec<br><br>production process: (followed from «brown [violet-red tone]») 1 g of goethite + 1 g of zirconium oxide / 1850 °F / 30 min. / slow cooling in furnace (followed at «reddish brown») |
| violet-brown (red tone) a bit darker than «dark violet-brown (red tone)» | 6333 | mineral : haematite<br>rock : medium chocolate-brown<br>powder : medium chocolate-brown<br>origin : Nouveau Québec, Québec<br><br>production process: (followed from «violet-brown a bit more brown, less dark than "dark violet-brown"») 0↑1800 °F (dark violet-brown) / powder irradiated with gamma[239] rays at 424.7 Mrad[734] |
| violet-brown (red tone) darker [more | 6334 | production process: 4 g of haematite + 80 ml nitric acid / soaking: 2 wk. / drying on hot plate (dark violet-brown) / |

| | | |
|---|---|---|
| brown] than «dark violet-brown (red tone)» | | irradiated with gamma rays at 64.7 Mrad (followed at «greyish brown [pinkish violet tone]») |
| violet-brown (grey tone) | | |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>granules[735] irradiated with gamma rays at: |
| light violet-brown tint (grey reflection) | 6335 | 5 Mrad |
| the tint is considerably accentuated ↓ and | 6336 | 10 Mrad |
| | 6337 | 57.4 Mrad |
| becomes lighter | 6338 | 64.7 Mrad<br>(followed at «greyish brown») |
| | | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «greyish brown [crimson tone]») |
| violet-brown (grey tone) | 6339 | 1 g of ochre + 2 g of halite / 0↑1700 °F<br>(followed at «iron-grey [violet tone]») |
| caput-mortuum[736] | | |
| | | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec |

| | | |
|---|---|---|
| caput-mortuum a bit more accentuated than «light caput-mortuum» | 6340 | production process:<br>(followed from «light caput-mortuum [violet-pink reflection]»)<br>.50 g of goethite + 1.50 g of titanium dioxide / 0↑1600 °F<br>(followed at «very, very light milky chocolate-brown») |
| caput-mortuum very lightly more pale than «accentuated caput-mortuum»<br>↓ | 6341 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «caput-mortuum [violet-red tone] a bit more accentuated and red than "medium caput-mortuum [violet-red tone]"»)<br>.50 g of goethite + .50 g of zirconium silicate (whitened rusty orange) / 1700 °F / 1 h (accentuated caput-mortuum [reddish violet tone]) / irradiated with gamma[228] rays at:<br>65.65 Mrad<br><br>(followed from «dark chocolate-brown») |
| caput-mortuum much darker than «accentuated caput-mortuum» | 6342 | 425.65 Mrad |
| caput-mortuum[736] (violet tone) | | |
| dark caput-mortuum (accentuated violet tone)<br>↓ | 6343 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «reddish brown»)<br>.50 g of goethite + .50 g of zirconium silicate (whitened rusty orange) / 0↑2100 °F<br>(followed from «reddish brown lighter than "reddish brown"») |

| | | |
|---|---|---|
| dark caput-mortuum (violet tone) | 6344 | .50 g of goethite + 1 g of zirconium silicate (whitened rusty orange) / 0↑2100 °F[737] (followed at «reddish brown more pale than "reddish brown"» and «caput-mortuum [grey tone with violet reflection]») |
| caput-mortuum[736] (crimson-violet tone) | | |
| dark caput-mortuum (accentuated crimson-violet tone) | 6345 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>0↑1400 °F / slow cooling in furnace (indian red[107]): 8 g + 96 g of sulphur / 1500 °F / 1 h (dark violet-brown): .50 g +.50 g of sulphur / 1600 °F / 1 h[738] (followed at «dark grey [reddish violet tone]») |
| caput-mortuum[736] (pinkish violet tone) | | |
| dark caput-mortuum (pinkish violet tone) | 6346 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>0↑1400 °F / slow cooling in furnace (indian red[107]): 8 g + 96 g of sulphur / 1500 °F / 1 h (dark violet-brown): .50 g + .50 g of zirconium silicate / 1600 °F / 1 h (followed at «greyish brown [light violet reflection] a bit darker than "dark greyish brown [light violet reflection]"») |
| caput-mortuum[736] (reddish violet tone) | | |
| | | mineral : goethite[106] |

1183

| | | |
|---|---|---|
| | | powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «medium caput-mortuum [violet-red tone]» and «brownish red») |
| accentuated caput-mortuum (reddish violet tone) | 6347 | .50 g of goethite + .50 g of zirconium silicate (rusty orange) / 1700 °F / 1 h<br>(followed at «orange-brown») |
| caput-mortuum[736] (pinkish lilac tone) | | |
| | | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br>production process:<br>(followed from «dark milky chocolate-brown») |
| caput-mortuum (accentuated pinkish lilac tone) | 6348 | .50 g of goethite + 1 g of titanium dioxide / 0↑500 °F |
| which | 6349 | .50 g of goethite + 1 g of titanium dioxide / 0↑800 °F |
| becomes progressively | 6350 | .50 g of goethite + 1 g of titanium dioxide / 0↑900 °F |
| more red | 6351 | .50 g of goethite + 1 g of titanium dioxide / 0↑1000 °F |
| | 6352 | .50 g of goethite + 1 g of titanium dioxide / 0↑1100 °F |
| ↓ | 6353 | .50 g of goethite + 1 g of titanium dioxide / 0↑1200 °F<br>(followed at «caput-mortuum [accentuated reddish lilac tone]») |
| caput-mortuum[736] (reddish lilac tone) | | |
| | | mineral : goethite[106]<br>powder : rusty orange<br>origin : Red Mill, in the suburbs of Cap-de-la-Madeleine, Québec |

| | | |
|---|---|---|
| caput-mortuum (accentuated reddish lilac tone) | 6354 | mineral : titanium dioxide<br>powder : white<br>origin : NL Chem Canada Inc., Québec<br><br>production process:<br>(followed from «caput-mortuum [accentuated pinkish lilac tone]»)<br>.50 g of goethite + 1 g of titanium dioxide / 0↑1300 °F<br>(followed at «pronounced pastel violet») |
| caput-mortuum[736] (pink tone) | | |
| medium caput-mortuum (light pink tone) | 6355 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «pronounced pastel violet»)<br>.50 g of goethite + 1 g of titanium dioxide / 0↑1600 °F<br>(followed at «light milky chocolate-brown [grey tone]») |
| caput-mortuum[736] (violet-pink tone) | | |
| light caput-mortuum (violet-pink tone) | 6356 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br>production process:<br>(followed from «reddish lilac»)<br>.50 g of goethite + 1.50 g of titanium dioxide / 0↑1400 °F<br>(followed at «caput-mortuum a bit more accentuated than "light caput-mortuum"») |
| medium caput-mortuum (violet-pink tone)<br>↓ | 6357 | production process:<br>.50 g of goethite + .50 g of titanium dioxide (whitened rusty orange) / 0↑1400 °F |
| darker or more brown caput-mortuum (very light violet-pink tone) | 6358 | .50 g of goethite + .50 g of titanium dioxide (whitened rusty orange) / 0↑1600 °F<br><br>(followed at «light milky chocolate-brown») |

| | | |
|---|---|---|
| caput-mortuum[736] (red tone) | | |
| caput-mortuum (red tone) | 6359 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «caput-mortuum [brown tone]»)<br>1 g of goethite + .50 g of titanium dioxide / 0↑1200 °F<br>(followed at «caput-mortuum [violet-red tone]») |
| caput-mortuum[736] (violet-red tone) | | |
| caput-mortuum (violet-red tone) | 6360 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «caput-mortuum [red tone]»)<br>1 g of goethite + .50 g of titanium dioxide / 0↑1300 °F<br>(followed at «dark lilac [red tone]») |
| caput-mortuum (violet-red tone) | 6361 | production process:<br>(followed from «caput-mortuum [brown tone]»)<br>1.50 g of goethite + .50 g of titanium dioxide / 0↑1300 °F<br>(followed at «light caput-mortuum [brown tone]») |
| caput-mortuum (violet-red tone) | 6362 | production process:<br>(followed from «light caput-mortuum [brown tone]»)<br>1.50 g of goethite + 1 g of titanium dioxide / 0↑1300 °F |
| | | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec |

| | | |
|---|---|---|
| medium caput-mortuum (violet-red tone) | 6363 | production process:<br>.50 g of goethite + .50 g of zirconium silicate (whitened rusty orange) / 1600 °F / 1 h<br>(followed at «caput-mortuum [reddish violet tone]») |
| caput-mortuum (violet-red tone a bit more accentuated and red than «medium caput-mortuum (violet-red tone)» | 6364 | production process:<br>.50 g of goethite + .50 g of zirconium silicate (whitened rusty orange) / 1600 °F / 1 h (medium caput-mortuum [violet-red tone]) / irradiated with gamma rays at 64.7 Mrad<br>(followed at «dark chocolate-brown» and «caput-mortuum very slightly more pale than "accentuated caput-mortuum"») |
| caput-mortuum[736] (brown tone) | | |
| | | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «caput-mortuum [violet-red tone]») |
| light caput-mortuum (brown tone) | 6365 | 1.50 g of goethite + 1 g of titanium dioxide / 0↑500 °F |
| which | 6366 | 1.50 g of goethite + 1 g of titanium dioxide / 0↑800 °F |
| becomes progressively more | 6367 | 1.50 g of goethite + 1 g of titanium dioxide / 0↑900 °F |
| red | 6368 | 1.50 g of goethite + 1 g of titanium dioxide / 0↑1000 °F |
| | 6369 | 1.50 g of goethite + 1 g of titanium dioxide / 0↑1100 °F |
| ↓ | 6370 | 1.50 g of goethite + 1 g of titanium dioxide / 0↑1200 °F<br>(followed at «caput-mortuum [violet-red tone]») |
| caput-mortuum (brown tone) | 6371 | production process:<br>(followed from «dark milky chocolate-brown»)<br>1 g of goethite + .50 g of titanium dioxide / 0↑500 °F |
| which | 6372 | 1 g of goethite + .50 g of titanium dioxide / 0↑800 °F |

| | | |
|---|---|---|
| becomes progressively | 6373 | 1 g of goethite + .50 g of titanium dioxide / 0↑900 °F |
| more red | 6374 | 1 g of goethite + .50 g of titanium dioxide / 0↑1000 °F |
| ↓ | 6375 | 1 g of goethite + .50 g of titanium dioxide / 0↑1100 °F (followed at «caput-mortuum [red tone]») |
| | | production process: (followed from «dark lilac [red tone]») |
| caput-mortuum (brown tone) | 6376 | 1.50 g of goethite + .50 g of titanium dioxide / 0↑500 °F |
| which | 6377 | 1.50 g of goethite + .50 g of titanium dioxide / 0↑800 °F |
| becomes progressively | 6378 | 1.50 g of goethite + .50 g of titanium dioxide / 0↑900 °F |
| more red | 6379 | 1.50 g of goethite + .50 g of titanium dioxide / 0↑1000 °F |
| | 6380 | 1.50 g of goethite + .50 g of titanium dioxide / 0↑1100 °F |
| ↓ | 6381 | 1.50 g of goethite + .50 g of titanium dioxide / 0↑1200 °F (followed at «caput-mortuum [violet-red tone]») |
| caput-mortuum[736] (violet-grey tone) | | |
| | | mineral : goethite[106]<br>powder : rusty orange<br>origin : Red Mill, in the suburbs of Cap-de-la-Madeleine, Québec<br>mineral : zirconium silicate<br>powder : white (very light yellow reflection)<br>origin : Sial Company, Québec |
| | | production process: (followed from «reddish brown more pale than "reddish brown"» and «dark caput-mortuum [violet tone]») |
| caput-mortuum (grey tone with violet reflection) | 6382 | .50 g of goethite + 1.50 g of zirconium silicate (whitened rusty orange) / 0↑2100°F |
| brown (green tone) | | |
| | | mineral : beryl<br>rock : light blue, slightly translucid<br>powder : light grey<br>origin : Abitibi, Québec |

| | | |
|---|---|---|
| pale brown (light green tone) | 6383 | production process:<br>(followed from «olive-green»)<br>rock irradiated with gamma rays at 602.804 Mrad |
| pale brown (light green tone) | 6384 | mineral : beryl<br>rock : light blue (near turquoise), slightly translucid<br>powder : light grey<br>origin : Lacorne district, Abitibi, Québec<br><br>production process:<br>(followed from «light greenish beige»)<br>rock irradiated with gamma rays at 602.804 Mrad |
| light brown (light green tone) | 6385 | mineral : galena<br>rock : dark grey, with metallic brilliance<br>powder : dark grey, with metallic brilliance<br>origin : Trail, British Columbia<br><br>mineral : steatite<br>rock : cold light grey, slightly translucid; stick measuring 1/2" x 4 7/8" x 1/8" and weighing 15 g<br><br>origin : East Broughton, Québec<br><br>production process:<br>2 g of galena + 2 g of sodium carbonate / deposited on a stick of steatite / 1400 °F / 1 h[280]<br>(followed at «light brown») |
| light brown (light green tone) | 6386 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «greenish brown [or colour between "brown" and "green"]»)<br>0↑700 °F<br>(followed at «light brown») |
| light brown (light | 6387 | mineral : quartz<br>rock : light pink, translucid<br>powder : very light grey<br>origin : unknown<br><br>production process:<br>4 g of quartz + 40 ml hydrochloric acid / soaking: |

1189

| | | |
|---|---|---|
| green tone) | | 7 d. / separation of the liquid and the solid / natural drying (colour of the liquid: green) / irradiated with gamma rays at 64.7 Mrad (followed at «mixture of particles: beige / brown») |
| light brown (light green tone) | 6388 | production process: 4 g of quartz + 40 ml hydrochloric acid / soaking: 7 d. / separation of the liquid and the solid / natural drying (colour of the liquid: light green) / irradiated with gamma rays at 64.7 Mrad (followed at «dark chocolate-brown») |
| brown (light green tone) a bit lighter than «brown (light green tone)» | 6389 | mineral : iron pyrite<br>powder : greyish brown, with golden yellow metallic brilliance<br>origin : Rigaud Seigniory, Beauce county, Québec<br><br>production process: 4 g of pyrite + 25 ml hydrochloric acid / soaking: 3 d. / drying on hot plate (brown [light green tone]) / irradiated with electrons at 162,431 rad |
| brown (localized green tone) | 6390 | mineral : anorthosite<br>rock : dark grey<br>powder : medium grey<br>origin : Jonquière, Lac Saint-Jean, Québec<br><br>production process: 0↑1900 °F (medium brown): .30 g + 50 ml hydrochloric acid / soaking: 2 wk. / drying on hot plate (brown) / irradiated with electrons at 162,431 rad |
| greenish brown | 6391 | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «dark brownish green»)<br>1.50 g of cement + .50 g of chrome / 2100 °F / 1 h<br><br>(followed at «dark green [light brown tone]») |
| ↓ | | (followed from «dark green [light brown tone]») |
| greenish brown still more brown | 6392 | 1.50 g of cement + .50 g of chrome / 2200 °F / 1 h (followed at «greyish brown») |

| | | |
|---|---|---|
| | | mineral : cement[269]<br>powder : medium brownish grey<br>origin : CALCO, Charlesbourg, Québec<br><br>mineral : chromite[294]<br>rock : dark grey<br>powder : dark grey<br>origin : Black Lake, Eastern Townships, Québec<br><br>production process:<br>(followed from «brown less dark than "brown"») |
| brown (light green tone) | 6393 | 1.50 g of chromite + 1 g of cement / 1000 °C / 2 h |
| greenish brown | 6394 | 1.50 g of chromite + 1.50 g of cement / 1000 °C / 2 h<br><br>(followed from «grass-green») |
| ↓ greenish brown | 6395 | 1 g of chromite + 1.50 g of cement / 1000 °C / 2 h |
| | | mineral : goethite[106]<br>powder : rusty orange<br>origin : Red Mill, in the suburbs of Cap-de-la-Madeleine, Québec<br><br>production process: |
| greenish brown | 6396 | 5 g of goethite + 100 ml sulphuric acid / soaking: 24 h / drying on hot plate |
| | | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «mint-green [brown tone]») |
| greenish brown [or colour between «brown» and «green»] | 6397 | 0↑650 °F<br>(followed at «light brown [light green tone]») |
| | | mineral : olivine<br>rock : light grey, crystalline<br>powder : very light grey<br>origin : Mont Albert, Gaspésie, Québec |

1191

| | | |
|---|---|---|
| greenish brown [tends towards olive-green] | 6398 | production process:<br>(followed from «brownish russet»)<br>2 g of olivine + 2 g of sodium carbonate / 0↑1600 °F + 20 min. at 1600 °F[739]<br>(followed at «medium brown [tends towards beige]») |
| brown (light green tone) | 6399 | mineral : iron pyrite<br>powder : greyish brown, with golden yellow metallic brilliance<br>origin : Rigaud Seigniory, Beauce county, Québec<br><br>production process:<br>4 g of pyrite + 25 ml hydrochloric acid / soaking: 3 d. / drying on hot plate |
| greenish brown | 6400 | mineral : serpentine<br>rock : yellowish green<br>powder : light greenish yellow<br>origin : probably Thetford Mines, Eastern Townships, Quebec<br><br>production process:<br>.3 g of serpentine + 50 cc of transparent polyester resin + 1% of catalyst / manual grinding / moulding / hardening (medium greenish yellow [caramel tone]) / irradiated with electrons at 155,082 rad<br>(followed at «greenish yellow [brown tone]») |
| greenish brown<br>↓<br>brown (accentuated green tone) | 6401<br><br>6402 | mineral : uraninite<br>rock : medium chocolate-brown (red Bordeau tone)<br>powder : medium milky chocolate-brown<br>origin : Yellowknife, Canada<br><br>production process:<br>2 g of uraninite + 2 g of potassium carbonate: 0↑1500 °F<br><br>0↑1600 °F<br>(followed at «olive-green») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |

| | | |
|---|---|---|
| greenish brown darker than «brown (light green tone)» | 6403 | production process:<br>2 g of iron sulphide - nickel + 2 g of sodium carbonate / 0↑1600 °F + 1 h at 1600 °F (orange [light green tone]) / irradiated with electrons at 162,431 rad |
| medium greenish brown | 6404 | mineral : sphalerite[31]<br>rock : honey-yellow<br>powder : pale honey-yellow<br>origin : Federal Mine, Lemieux district, Gaspésie, Québec<br><br>production process:<br>4 g of sphalerite + 25 ml hydrochloric acid / soaking: 24 h / drying on hot plate |
| medium brown (green tone) | 6404.1 | mineral : uraninite<br>rock : medium chocolate-brown (red Bordeau tone)<br>powder : medium milky chocolate-brown<br>origin : Yellowknife, Canada<br><br>production process:<br>1 g of uraninite + 6.50 g of glass powder (spruce pine batch) / manual grinding / deposit on a ceramic plate at the state of a biscuit / heating in a furnace 0↑1000 °C in ambient air / slow cooling in furnace (brownish green [yellow reflection]) / irradiated with gamma rays at 7.41 Mrad |
| brown (pronounced green tone) | 6405 | mineral : fluorescent calcite<br>rock : white (localized grey or brown reflection), translucid<br>powder : white (yellow reflection)<br>origin : Bancroft, Ontario<br><br>mineral : chromite[294]<br>rock : dark grey<br>powder : dark grey<br>origin : Black Lake, Eastern Townships, Québec<br><br>production process:<br>(followed from «grass-green [light brown tone]»)<br>1.50 g of calcite + .50 g of chromite / 1000 °C / 1 h |
| | | mineral : peridotite<br>rock : medium grey<br>powder : medium brownish grey (green reflection)<br>origin : Thetford Mines, Québec |

| | | |
|---|---|---|
| | | <u>production process:</u><br>(followed from «medium orange-brown»)<br>1 g of peridotite + 1 cc of transparent white synthetic enamel paint used for the car / manual grinding / application on a piece of steel sheet used for the car's body, measuring 1" x 1" (very pale greenish grey) / irradiated with gamma rays at: |
| dark greenish brown or dark green (brown tone)<br>↓ | 6406 | 247.4 Mrad |
| greenish brown or green (brown tone) still darker | 6407 | 360 Mrad |
| | | mineral : agate<br>rock : dark grass-green, slightly translucid<br>powder : light grey (light green tone)<br>origin : bank of Saint-Lawrence river, region of Maria, Gaspésie, Québec<br><br><u>production process:</u><br>(followed from «grass-green much darker than "dark grass-green"») |
| blackish brown (localized green reflection) | 6408 | rock irradiated with gamma rays at 602.804 Mrad |
| mixture of particles | | |
| | | mineral : galena<br>rock : dark grey, with metallic brilliance<br>powder : dark grey, with metallic brilliance<br>origin : Trail, British Columbia<br><br><u>production process:</u> |
| greenish brown / brown / black | 6409 | 2 g of galena + 2 g of sodium carbonate / 1400 °F / 1 h (mixture of particles: green / orange) / irradiated with electrons at 162,431 rad |
| | | <u>production process:</u> |
| greenish brown more pronounced than «greenish brown» / light brown / light beige / light grey | 6410 | 2 g of galena + 2 g of sodium carbonate / 1400 °F / 1 h (mixture of particles: green / orange) / irradiated with gamma rays at 64.7 Mrad<br><br>(followed at «dark greyish brown») |
| | | mineral : dolomite<br>rock : light grey<br>powder : light grey<br>origin : Shefferville, Ungava, Québec |

| | | |
|---|---|---|
| medium greenish brown / grey / yellowish cream | 6411 | <u>production process:</u><br>2 g of dolomite + 2 g of sodium carbonate / 0↑1500 °F + 1 h at 1500 °F (mixture of particles: light green / beige) / irradiated with electrons at 302,831 rad[45] |
| brown (orange-green tone) | | |
| medium greenish brown (localized orange reflection) | 6412 | mineral : chromite<br>rock : blackish grey<br>powder : medium brownish grey<br>origin : Black Lake, near Thetford Mines, Québec<br><br><u>production process:</u><br>(followed from «pronounced olive-green [orange reflection]"»)<br>2 g of chromite + 2 g of sodium carbonate / 0↑1900 °F + 1:45 h à 1900 °F (apple-green darker than «dark apple-green») / irradiated with gamma rays at 424.7 Mrad |
| brown (mint-green tone) | | |
| light brown (mint-green tone) or light mint-green (brown tone) | 6413 | mineral : obsidian<br>rock : very dark smoky grey, almost black<br>powder : light grey<br>origin : Arkansas, United States<br><br><u>production process:</u><br>(followed from «pronounced olive-green [orange reflection]»)<br>2 g of obsidian + 20 ml hydrochloric acid / soaking: 3 d. / drying on hot plate (white): .3 g + 50 cc of transparent polyester resin + 1% of catalyst / manual grinding / moulding / hardening (medium cold mint-green) / irradiated with electrons at 155,082 rad<br>(followed at «mint-green») |
| brown (evergreen tone) | | |
| medium brown (evergreen tone) | 6414 | mineral : tremolite<br>rock : medium brown (evergreen tone)<br>powder : greyish beige<br>origin : Tetreault Mine, Montauban, Portneuf county, Québec<br><br><u>production process:</u><br>rock irradiated with gamma rays at:<br>5 Mrad |
| \| | | |
| brown (evergreen | 6415 | 10 Mrad |

| | | |
|---|---|---|
| tone) slightly darker | | |
| ↓ | | |
| brown (evergreen tone) still slightly darker [yellow areas] | 6416 | 57.4 Mrad |
| ↓ | | |
| brown (evergreen tone) still slightly darker [yellow areas] | 6417 | 63.984 Mrad<br>(followed at «chocolate-brown [with orange areas]») |
| brown (olive-green tone) | | |
| | | mineral : almandite<br>rock : dark brownish red<br>powder : medium brownish red<br>origin : Gore Mountain, Warren, state of New York, United States<br><br>production process:<br>(followed from «chocolate-brown darker than "light chocolate-brown"») |
| brown (olive-green tone) | 6418 | 2 g of almandite + 2 g of sodium carbonate / 0↑1500 °F + 15 min at 1500 °F[740] |
| ↓ | | |
| brown (olive-green tone a bit more accentuated) | 6419 | 2 g of almandite + 2 g of sodium carbonate / 0↑1500 °F + 30 min at 1500 °F[740] |
| ↓ | | |
| brown (olive-green tone still a bit more accentuated) | 6420 | 2 g of almandite + 2 g of sodium carbonate / 0↑1500 °F + 45 min at 1500 °F[740]<br>(followed at «olive-green [brown tone]») |
| | | mineral : PbO<br>powder : yellow (light orange tone)<br><br>production process:<br>(followed from «olive-green [accentuated green and brown tones]»)<br>irradiated with gamma rays at: |
| brown (olive-green tone) | 6421 | 247.6 Mrad |
| ↓ | | |
| brown (olive-green tone) more accentuated | 6422 | 287.3 Mrad |
| ↓ | | |
| brown (olive-green | 6423 | 360 Mrad |

1196

| | | |
|---|---|---|
| tone) still more accentuated<br>\|<br>medium brown (olive-green tone) | 6424 | 602.804 Mrad |
| medium brown (olive-green tone) | 6425 | mineral : dolomite<br>rock : light grey<br>powder : light grey<br>origin : Shefferville, Ungava, Québec<br><br>production process:<br>(followed from «beige»)<br>2 g of dolomite + 2 g of sodium carbonate / 0↑1900 °F + 1 h at 1900 °F (olive-green lighter than «olive-green») / irradiated with gamma rays at 423.88 Mrad |
| dark brown (light olive-green tone) | 6426 | mineral : hypersthene<br>rock : black<br>powder : medium brownish grey<br>origin : Lac Saint-Jean, Québec<br><br>production process:<br>2 g of hypersthene + 2 g of nitric acid / soaking: 3 d. / drying on hot plate |
| blackish brown (localized olive-green reflection) | 6427 | mineral : andulusite<br>rock : light brownish grey<br>powder : light grey<br>origin : Bimbowrie, South Australia<br><br>production process:<br>(followed from «very intense olive-green»)<br>.81 g of andulusite + 1.31 g of sodium carbonate / 1700 °F / 1 h (apple-green) / irradiated with gamma rays at 425.65 Mrad |
| khaki-brown | | |
| light khaki-brown | 6428 | mineral : fluorescent calcite<br>rock : white (localized grey or brown reflection), translucid<br>powder : white (yellow reflection)<br>origin : Bancroft, Ontario<br><br>mineral : chromite[294]<br>rock : dark grey<br>powder : dark grey<br>origin : Black Lake, Eastern Townships, Québec<br><br>production process:<br>1.50 g of calcite + .25 g of chromite / |

| | | |
|---|---|---|
| [or light brown with a light green tone] | 6429 | 1000 °C / 2 h<br><br>(followed at «grass-green [light brown tone]») |
| khaki-brown [or greenish brown] | 6430 | mineral : chromite<br>rock : blackish grey<br>powder : medium brownish grey<br>origin : Black Lake, near Thetford Mines, Québec<br><br>production process:<br>2 g of chromite + 2 g of sodium carbonate / 0↑1500 °F + 1 h at 1500 °F<br>(followed at «dark olive-green») |
| khaki-brown (light green tone) | 6431 | mineral : haematite<br>rock : medium chocolate-brown<br>powder : medium chocolate-brown<br>origin : Nouveau Québec, Québec<br><br>production process:<br>4 g of haematite + 25 ml nitric acid / soaking: 4 d. / drying on hot plate |
| medium khaki-brown | ~~6431~~ | mineral : halite[41]<br>rock : colourless<br>powder : colourless<br>origin : Seleine Mine, Iles-de-la-Madeleine, Québec<br><br>production process:<br>1 g of halite + 1 cc of white transparent synthetic enamel paint used for the car / manual grinding / application on a piece of steel sheet used for the car's body, measuring 1" x 1" (cream) / irradiated with gamma rays at 3.77 Mrad<br>(followed at «khaki-green») |
| dark khaki-brown [or dark greenish | 6432 | mineral : fluorescent calcite<br>rock : white (localized grey or brown reflection), translucid<br>powder : white (yellow reflection)<br>origin : Bancroft, Ontario<br><br>mineral : chromite[294]<br>rock : dark grey<br>powder : dark grey<br>origin : Black Lake, Eastern Townships, Québec<br><br>production process:<br>(followed from «grass-green [light brown tone]»)<br>1.50 g of calcite + 1 g of chromite / 1000 °C / 2 h |

1198

| | | |
|---|---|---|
| brown] | | (followed at «chocolate-brown») |
| Khaki-brown (yellow tone) | | |
| medium khaki-brown (yellow tone) | 6433 | mineral : anorthosite<br>rock : dark grey<br>powder : medium grey<br>origin : Jonquière, Lac Saint-Jean, Québec<br><br>production process:<br>6 g of anorthosite + 50 ml nitric acid / soaking: 2 wk. / drying on hot plate |
| brown (yellow tone) | | |
| pale brown (yellow tone), with a cold metallic brilliance | 6434 | mineral : hornblende<br>rock : medium evergreen (light grey tone), with a vitreous brilliance<br>powder : medium cold grey (light green tone)<br>origin : Abitibi, Québec<br><br>mineral : sulphur<br>rock : brilliant yellow<br>powder : brilliant yellow<br>origin : unknown<br><br>production process:<br>2 g of hornblende + 2 g of sulphur / 1300 °F / 1 h (orange-yellow [tends towards brown], with a warm metallic brilliance) / irradiated with electrons at 302,831 rad[36] |
| very light brown (light yellow tone) | 6435 | mineral : fluorine<br>rock : light pink, translucid<br>powder : white (light pink reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (very light beige): .2 g + 50 cc of transparent polyester resin + 1% of catalyst / manual grinding / moulding / hardening (light lemon-yellow) / irradiated with electrons at 155,082 rad<br>(followed at «lemon-yellow more intense than "light lemon-yellow"») |
| | | mineral : apatite<br>rock : dark grass-green (yellow tone)<br>powder : powder filtered at 14 meshes: very, very light green; powder filtered |

1199

| | | |
|---|---|---|
| | | beneath 14 meshes: light beige-grey (green tone) |
| light brown (yellow tone) | 6436 | production process: 3 g of apatite + 20 ml nitric acid / soaking: 3 d. / drying on hot plate (light yellow): .3 g + 50 cc of transparent polyester resin + 1% of catalyst / manual grinding / moulding / hardening (very light lemon-yellow) / irradiated with electrons at 155,082 rad (followed at «lemon-yellow») |
| light brown (yellow tone) | 6437 | mineral : corundum<br>rock : medium grey<br>powder : light grey<br>origin : Transvaal, Africa<br><br>production process: 0↑1900 °F (grey [brown tone]): 1 g + 50 ml hydrochloric acid / soaking: 2 wk. / drying on hot plate |
| brown (light yellow tone) very slightly darker than «light brown [light yellow tone]» | 6438 | mineral : hornblende<br>rock : medium evergreen (light grey tone), with a vitreous brilliance<br>powder : medium cold grey (light green tone)<br>origin : Abitibi, Québec<br><br>production process: 3 g of hornblende + 25 ml hydrochloric acid / soaking: 24 h / drying on hot plate (medium orange-brown [light green tone, khaki-green type]): 1 g + 1 cc of white transparent printing ink / mechanical grinding / 13 superimpositions on white glazed paper (light brown [light yellow tone]) / irradiated with gamma rays at 11.4 Mrad[89,742] |
| medium brown (yellow tone) ↓ | 6439 | mineral : cerite<br>rock : dark brownish grey<br>powder : light grey (light brown tone)<br>origin : Jamestown, Boulder county, Colorado, United States<br><br>production process: (followed from «light grey [light brown tone]») powder irradiated with gamma rays at: 360 Mrad |

1200

| | | |
|---|---|---|
| brown (yellow tone a bit darker [diminished yellow tone]) | 6440 | 604.53 Mrad |
| | | mineral : sphalerite[31]<br>rock : honey-yellow<br>powder : pale honey-yellow<br>origin : Federal Mine, Lemieux district, Gaspésie, Québec |
| medium yellowish brown | 6441 | production process:<br>80 g of sphalerite + 100 ml hydrochloric acid / soaking: 5 months / natural drying |
| yellowish brown more intense than «medium yellowish brown» | 6442 | production process:<br>80 g of sphalerite + 100 ml hydrochloric acid / soaking: 5 months / natural drying (medium yellowish brown) / irradiated with gamma rays at 64.7 Mrad<br>(followed at «orange-brown [yellow tone and green reflection]») |
| | | mineral : halite[41]<br>rock : colourless<br>powder : colourless<br>origin : Seleine Mine, Iles-de-la-Madeleine, Québec |
| yellowish brown more accentuated and luminous than «medium yellowish brown» | 6443 | production process:<br>2 g of halite + 2 g of sodium carbonate / 0↑1300 °F + 1 h at 1300 °F (medium orange-brown) / irradiated with electrons at 302,831 rad[239] |
| | | mineral : anorthosite<br>rock : dark grey<br>powder : medium grey<br>origin : Jonquière, Lac Saint-Jean, Québec |
| darker and more intense yellowish brown | 6444 | production process:<br>6 g of anorthosite + 50 ml nitric acid / soaking: 2 wk. / drying on hot plate (medium khaki-brown [yellow tone]) / irradiated with gamma rays at 424.7 Mrad[81] |
| brown (orange-yellow tone) | | |
| | | mineral : hornblende<br>rock : medium evergreen (light grey tone), with a vitreous brilliance<br>powder : medium cold grey (light green tone)<br>origin : Abitibi, Québec |

1201

| | | |
|---|---|---|
| dark brown (orange-yellow tone), light and cold metallic brilliance | 6445 | mineral : sulphur<br>rock : brilliant yellow<br>powder : brilliant yellow<br>origin : unknown<br>production process:<br>(followed from «brown [diminished reddish orange tone] more pale than "medium brown [reddish orange tone]"»)<br>2 g of hornblende + 2 g of sulphur / 1300 °F / 1 h (orange-yellow [tends towards brown], with a hot metallic brilliance) / irradiated with gamma rays at 424.7 Mrad |
| golden brown | | |
| light brown (golden reflection) | 6446 | mineral : crocidolite<br>rock : dark greyish blue<br>powder : pale greyish blue<br>origin : Griqualand district, South Africa<br><br>production process:<br>0↑1000 °F<br>(followed at «brownish orange [red tone]») |
| brown (orange tone) | | |
| orange-brown more pale than «pale orange-brown» | 6447 | mineral : asbestos[4]<br>rock : dark grey (green reflection)<br>powder : light grey (green reflection)<br>origin : Asbestos Corporation Ltd., Thetford Mines, Québec<br>production process:<br>3 g of asbestos + 100 ml nitric acid / soaking: 24 h / drying on hot plate (pale orange-brown) / 0↑900 °F |
| pale orange-brown | 6448 | production process:<br>3 g of asbestos + 100 ml nitric acid / soaking: 24 h / drying on hot plate |
| pale orange-brown | 6449 | mineral : amazonite<br>rock : light greenish turquoise<br>powder : white (turquoise reflection)<br>origin : Lac Sairs, Témiscamingue, Québec<br>production process:<br>(followed from «brownish grey»)<br>1 g of amazonite + 1 cc of white transparent synthetic enamel paint used for the car / manual grinding / application on a piece of steel sheet used for the car's body measuring 1" x 1" (very light grey) / irradiated with gamma rays at 102.4 Mrad<br>(followed at «khaki-green [with orange areas]») |

1202

| | | |
|---|---|---|
| pale orange-brown | 6450 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «brownish beige [orange tone]»)<br>2 g of ochre + 1 g of titanium dioxide /<br>0↑1750 °F |
| very light orange-brown | 6451 | mineral : dolomite<br>rock : light grey<br>powder : light grey<br>origin : Shefferville, Ungava, Québec<br><br>production process:<br>2 g of dolomite + 20 ml nitric acid / soaking: 3 d. / drying on hot plate |
| orange-brown [lightened orange tone] much more pale than «light orange-brown» | 6452 | mineral : steatite<br>rock : light evergreen<br>powder : white<br>origin : East Broughton, Québec<br><br>production process:<br>2200 °F / 1 h (light orange-brown) / powder irradiated with gamma rays at 64.7 Mrad |
| orange-brown more pale and less orange than «light orange-brown» | 6453 | mineral : actinolite<br>rock : light and cold evergreen<br>powder : light grey (light green tone)<br>origin : erratic block found at Saint-Philémon near Dorchester, Québec<br><br>production process:<br>0↑1900 °F (light brown [very light orange tone]) / powder irradiated with gamma[239] rays at 64.7 Mrad (followed at «orange-brown much more accentuated than "light orange-brown"») |
| light brown (very light orange tone) | 6454 | production process:<br>0↑1900 °F |
| | | mineral : crocidolite<br>rock : dark greyish blue |

1203

| | | |
|---|---|---|
| light orange-brown | 6455 | powder : pale greyish blue<br>origin : Griqualand district, South Africa<br><br>production process:<br>(followed from «brown ochre [reddish orange tone]»)<br>2 g of crocidolite + 2 g of sodium carbonate / 1400 °F / 1 h<br>(followed at «orange-brown») |
| light orange-brown | 6456 | mineral : anorthosite<br>rock : light grey<br>powder : very, very light greyish beige<br>origin : rang Sainte-Germaine, Oka, Québec<br><br>production process:<br>(followed from «light orange-beige»)<br>rock irradiated with gamma rays at 148.4 Mrad<br>(followed at «medium chocolate-brown») |
| light orange-brown | 6457 | mineral : chalcopyrite<br>powder : dark grey (light green tone)<br>origin : Centre de recherche des Mines Noranda in Montréal, Québec<br><br>production process:<br>(followed from «medium chocolate-brown»)<br>4 g of chalcopyrite + 50 ml nitric acid / soaking: 3 d. / separation of the liquid and the solid / drying on sand bath / colour of the solid[743] |
| light orange-brown<br>↓<br>lighter orange-brown<br>↓<br>orange-brown more brown and less orange | 6458<br><br>6459<br><br>6460 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «medium pinkish brown»)<br>2 g of ochre + 1 g of titanium dioxide:<br>0↑1600 °F<br><br>0↑1650 °F<br><br>0↑1700 °F<br>(followed at «pale orange [brown tone]») |

1204

| | | |
|---|---|---|
| light orange-brown | 6461 | mineral : serpentine<br>rock : yellowish green<br>powder : light greenish yellow<br>origin : probably Thetford Mines, Eastern Townships, Québec<br><br><u>production process:</u><br>(followed from «brownish beige»)<br>2 g of serpentine + 2 g of sodium carbonate / 0↑1300 °F + 1 h at 1300 °F<br>(followed at «pale orange») |
| light brown (light orange tone) | 6462 | mineral : sphalerite[27]<br>rock : dark grey, golden yellow metallic brilliance<br>powder : dark brownish grey<br>origin : Matagami Mine, Matagami, Québec<br><br><u>production process:</u><br>(followed from «creamy beige»)<br>4 g of sphalerite + 25 ml nitric acid / soaking: 3 d. / separation of the liquid (1st) and the solid / addition of 25 ml nitric acid to the same solid / soaking: 3 d. / separation in 3 parts: a) the liquid (2nd) at the surface; b) the layer in the middle: a mixture of liquid and solid; c) the residual solid at the bottom of the solution / natural drying (colour of the layer in the middle [mixture of the liquid and the solid: creamy beige which tends towards «brownish beige»]) / irradiated with gamma rays at 424.7 Mrad |
| light orange-brown | 6463 | mineral : steatite<br>rock : light cold grey, slightly translucid<br>powder : light grey<br>origin : East Broughton, Québec<br><br><u>production process:</u><br>(followed from «orange-beige»)<br>0↑2200 °F<br>(followed at «greyish brown [light copper reflection]» and «beige [orange-pink tone]») |
| light orange-brown | 6464 | mineral : steatite<br>rock : light evergreen<br>powder : white<br>origin : East Broughton, Québec<br><br><u>production process:</u><br>(followed from «orange-beige»)<br>2200 °F / 1 h |

| | | |
|---|---|---|
| light orange-brown | 6465 | <u>production process:</u><br>(followed from «orange-beige»)<br>0↑1300 °F (light grey [brown tone]): 2 g + 25 ml nitric acid / soaking: 3 d. / drying on hot plate (followed at «orange-brown darker than "light orange-brown"») |
| orange-brown much more accentuated and luminous than «light orange-brown» [orange tone more acute] | 6466 | mineral : actinolite<br>rock : light and cold evergreen<br>powder : light grey (light green tone)<br>origin : erratic block found at Saint-Philémon near Dorchester, Québec<br><br><u>production process:</u><br>(followed from «orange-brown more pale and less orange than "light orange-brown"»)<br>0↑1900 °F (light brown [very light orange tone]) / powder irradiated with gamma[239] rays at 424.7 Mrad |
| orange-brown a bit darker than «light orange-brown» | 6467 | mineral : bauxite[92]<br>powder : pinkish beige, mat<br>origin : Alcan Company, French Guyana<br><br><u>production process:</u><br>(followed from «chamois-brown lighter than "medium chamois-brown"»)<br>0↑1400 °F (pinkish chamois lighter than at 1300 °F): 3 g + 25 ml nitric acid / soaking: 3 d. / drying on hot plate (light beige-chamois): .3 g + 50 cc of transparent polyester resin + 1% of catalyst / manual grinding / moulding / hardening (medium orange [brown tone]) / irradiated with electrons at 305,082 rad[354] |
| orange-brown a bit darker and less orange than «light orange-brown» | 6468 | mineral : steatite<br>rock : light cold grey, slightly translucid<br>powder : light grey<br>origin : East Broughton, Québec<br><br><u>production process:</u><br>0↑2200 °F (light orange-brown) / powder irradiated with gamma rays at 64.7 Mrad<br>(followed at «medium milky chocolate-brown [very light orange tone]») |

| | | |
|---|---|---|
| orange-brown a bit darker than «light orange-brown» | 6469 | production process:<br>0↑2200 °F (light orange-brown) / powder irradiated with electrons at 162,431 rad<br>(followed at «orange-brown [caramel tone]») |
| orange-brown darker than «light orange -brown» | 6470 | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «light brown»)<br>rock irradiated with gamma rays at 424.7 Mrad |
| orange-brown darker than «light orange -brown» | 6471 | mineral : steatite<br>rock : light evergreen<br>powder : white<br>origin : East Broughton, Québec<br><br>production process:<br>(followed from «light orange-brown»)<br>0↑1500 °F (light brownish grey): 2 g + 25 ml nitric acid / soaking: 3 d. / drying on hot plate<br>(followed at «orange») |
| orange-brown a bit lighter than «orange-brown» | 6472 | mineral : magnetite<br>rock : dark grey, with metallic brilliance<br>powder : dark grey<br>origin : Fosse du Labrador, Québec<br><br>production process:<br>0↑1900 °F (dark chocolate-brown): 1 g + 50 ml hydrochloric acid / soaking: 2 wk. / drying on hot plate (orange-brown) / irradiated with gamma rays at 70.4 Mrad<br>(followed at «black») |
| orange-brown lighter than «orange-brown» | 6473 | production process:<br>0↑1900 °F (dark chocolate-brown): 1 g + 50 ml hydrochloric acid / soaking: 2 wk. / drying on hot plate (orange-brown) / irradiated with electrons at 162,431 rad |
| | | mineral : agate<br>rock : grey (with a light orange circular area on the surface), slightly translucid |

| | | |
|---|---|---|
| | | powder : very light grey<br>origin : unknown<br><br>production process:<br>(followed from «orange darker than "orange"»)<br>the orange circular area of the rock is irradiated with gamma[67,73] rays at 201.6 Mrad<br>(followed at «dark reddish brown») |
| orange-brown | 6474 | |
| orange-brown | 6475 | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 100 ml hydrochloric acid / soaking: 5 months / natural drying |
| orange-brown | 6476 | mineral : crocidolite<br>rock : dark greyish blue<br>powder : pale greyish blue<br>origin : Griqualand district, South Africa<br>production process:<br>(followed from «light brown ochre [green reflection]»)<br>2 g of crocidolite + 2 g of sodium carbonate / 0↑1500 °F + 1 h at 1500 °F[239]<br>(followed at «medium orange-brown») |
| orange-brown | 6477 | production process:<br>(followed from «light orange-brown»)<br>2 g of crocidolite + 2 g of sodium carbonate / 1500 °F / 1 h[239]<br>(followed at «light khaki–green») |
| orange-brown | 6478 | mineral : antigorite<br>rock : pale yellowish green<br>powder : very pale greenish yellow<br>origin : Canadian Refractories Mine, Kilmar, Québec<br>production process:<br>(followed from «khaki–green [orange-brown tone]»)<br>1 g of serpentine + 1 cc of white transparent synthetic enamel paint used for the car / manual grinding / application on a piece of steel sheet used for the car's body measuring 1" x 1" (khaki-green) / irradiated with gamma rays at 360 Mrad[745] |
| | | mineral : bauxite[92]<br>powder : pinkish beige, mat<br>origin : Alcan Company, French Guyana |

| | | |
|---|---|---|
| orange-brown | 6479 | production process:<br>0↑1500 °F (pinkish chamois): 3 g + 15 ml hydrochloric acid + 10 ml nitric acid / soaking: 3 d. / drying on hot plate (rusty orange [pink tone] lighter than «medium rusty orange [pink tone]»): .3 g + 50 cc of transparent polyester resin + 1% of catalyst / manual grinding / moulding / hardening (light chamois [strong orange tone]) / irradiated with electrons at 155,082 rad (followed at «orange a bit more intense and dark than "light orange"») |
| orange-brown | 6480 | mineral : bornite<br>rock : reddish brown (with localized green and bluish green oxidation)<br>powder : reddish brown<br>origin : Lac Musset, Fosse du Labrador, Québec<br><br>production process:<br>(followed from «orange-beige»)<br>2 g of bornite + 25 ml hydrochloric acid / soaking: 6 d. / separation of the liquid and the solid / natural drying (colour of the solid: light yellowish green) / irradiated with electrons at 305,200 rad[73] |
| orange-brown | 6481 | mineral : fluorescent calcite<br>rock : white (localized grey or brown reflection), translucid<br>powder : white (yellow reflection)<br>origin : Bancroft, Ontario<br><br>production process:<br>rock irradiated with electrons at 305,200 rad[73,239] |
| orange-brown | 6482 | production process:<br>(followed from «brown-orange»)<br>rock irradiated with gamma rays at 604.53 Mrad |
| orange-brown | 6483 | mineral : chalcopyrite<br>rock : brass-yellow, metallic brilliance<br>powder : dark grey (with golden particles)<br>origin : Noranda Mines, Noranda, Abitibi, Québec<br><br>production process:<br>rock entirely covered with 20 ml hydrochloric acid |

1209

| | | |
|---|---|---|
| | | / soaking: 2 wk. / irradiated with gamma rays at 5.7 Mrad / drying on sand bath, completed on hot plate[746] |
| brown (light orange tone) | 6484 | mineral : corundum<br>rock : rusty yellow<br>powder : light grey<br>origin : Mount Eagle, Ontario<br><br>production process:<br>2 g of corundum + 25 ml hydrochloric acid / soaking: 24 h / drying on hot plate |
| orange-brown | 6485 | mineral : corundum<br>rock : medium grey<br>powder : light grey<br>origin : Transvaal, Africa<br><br>production process:<br>(followed from «mixture of particles: orange-brown / brown»)<br>2 g of corundum + 2 g of sodium carbonate / 0↑1900 °F + 1 h at 1900 °F |
| orange-brown | 6486 | mineral : clay<br>block : pale greyish green<br>powder : pale greyish green<br>origin : bank of St.-Lawrence river, at the rear of the Miguasha Museum, Gaspésie, Québec<br><br>production process:<br>(followed from «rusty orange»)<br>1 g of clay + 50 ml nitric acid / drying on hot plate (medium rusty orange [tends towards red]) / irradiated with gamma rays at 424.7 Mrad |
| orange-brown | 6487 | mineral : biotite gneiss<br>rock : blackish grey, golden vitreous brilliance<br>powder : dark grey<br>origin : Grenville geological province, Québec<br><br>production process:<br>12 g of gneiss + 40 ml hydrochloric acid / soaking: 22 d. / separation of the liquid and the solid / natural drying (colour of the solid: yellowish green) / irradiated with electrons at 164,800 rad |
| | | mineral : goethite[106]<br>powder : rusty orange |

1210

| | | |
|---|---|---|
| | | origin : Red Mill, in the suburbs of Cap-de-la-Madeleine, Québec<br><br>production process: |
| orange-brown and brown of various tones | 6488 | 0↑1400 °F / slow cooling in furnace (indian red[107]): .50 g + 10 ml hydrochloric acid / soaking: 5 d. / drying on hot plate[912] |
| | 6489 | 0↑1700 °F (indian red [light violet tone]): .50 g + 10 ml hydrochloric acid / soaking: 5 d. / drying on hot plate[912] |
| | 6490 | 0↑1800 °F (indian red [violet tone]): .50 g + 10 ml hydrochloric acid / soaking: 5 d. / drying on hot plate[912] |
| | 6491 | 0↑1900 °F (reddish violet): .50 g + 10 ml hydrochloric acid / soaking: 5 d. / drying on hot plate[912] |
| | 6492 | 0↑2000 °F (violet): .50 g + 100 ml hydrochloric acid / soaking: 5 d. / drying on hot plate[912] |
| orange-brown | 6493 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «brownish red» and «accentuated caput-mortuum [reddish violet tone]»)<br>1 g of goethite + 1 g of zirconium silicate / 1700 °F / 1 h |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «chocolate-brown lighter than "chocolate-brown"» and «light chocolate-brown») |

1211

| | | |
|---|---|---|
| brown (light orange tone) | 6494 | 2 g of goethite + 24 g of sulphur / 500 °F / 1 h<br><br>(followed from «brown [light red tone]») |
| ↓ | | |
| brown (light orange tone) | 6495 | 2 g of goethite + 2 g of sulphur / 600 °F / 1 h<br><br>(followed at «chocolate-brown lighter than "chocolate-brown"» and «rusty brown»)<br><br>(followed from «light mossy chocolate-brown [ashen tone]») |
| ↓ | | |
| brown (very light orange tone) | 6496 | 2 g of goethite + 24 g of sulphur / 600 °F / 1 h[747]<br>(followed at «rusty brown» and «chocolate-brown lighter than "chocolate-brown"») |
| orange-brown | 6497 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Barraute, Abitibi, Québec<br><br>production process:<br>1 g of goethite + 1 g of feldspar (reddish brown) / irradiated with gamma rays at 482.984 Mrad[505,509,748] |
| orange-brown | 6498 | mineral : almandite<br>rock : dark brownish red<br>powder : medium brownish red<br>origin : Gore Mountain, Warren county, New York state, United States<br><br>production process:<br>4 g of almandite + 80 ml hydrochloric acid / soaking: 2 wk. / drying on hot plate |
| brown (light orange | 6499 | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>(followed from «greyish brown»)<br>2 g of ilmenite + 2 g of sodium carbonate / |

| | | |
|---|---|---|
| tone) | | 0↑1400 °F + 1 h at 1400 °F<br>(followed at «reddish orange-brown») |
| orange-brown | 6500 | mineral : magnetite<br>rock : dark grey, with metallic brilliance<br>powder : dark grey<br>origin : Fosse du Labrador, Québec<br><br><u>production process:</u><br>0↑1900 °F (dark chocolate-brown): 1 g + 50 ml hydrochloric acid / soaking: 2 wk. / drying on hot plate |
| orange-brown | 6501 | <u>production process:</u><br>0↑1900 °F (dark chocolate-brown): 1 g + 50 ml sulphuric acid / soaking: 2 wk. / drying on hot plate (very dark brown, almost black) / irradiated with electrons at 162,431 rad |
| orange-brown | 6502 | mineral : ochre[98]<br>powder : yellow<br>origin : small copper and nickel deposit, in the South-Western area of a mass of serpentinite at 3 km at the West of Saint-Fabien-de-Panet, Québec<br><br><u>production process:</u><br>(followed from «very dark brown»)<br>2 g of ochre + 2 g of sodium carbonate /<br>0↑1700 °F + 1 h at 1700 °F<br>(followed at «brown-orange») |
| orange-brown | 6503 | mineral : ochre[20]<br>powder : orange<br>origin : small copper and nickel deposit, in the South-Western area of a mass of serpentinite at 3 km at the West of Saint-Fabien-de-Panet, Québec<br><br><u>production process:</u><br>15 g of ochre + 100 ml hydrochloric acid / soaking: 24 h / drying on hot plate |
| orange-brown | 6504 | <u>production process:</u><br>(followed from «reddish orange ochre»)<br>0↑1900 °F<br>(followed at «reddish brown») |
| | | mineral : ochre[20]<br>powder : orange<br>origin : small copper and nickel deposit, in the South-Western area of a mass of |

1213

| | | |
|---|---|---|
| | | serpentinite at 3 km at the West of Saint-Fabien-de-Panet, Québec<br><br>mineral : chrome<br>powder : light grey, with metallic briliance<br><br>production process:<br>1 g of ochre + 1 g of chrome / 2000 °F / 45 min. |
| orange-orown | 6505 | |
| orange-brown | 6506 | mineral : olivine<br>powder : colourless (green reflection)<br>origin : Mount Haven, United States<br><br>production process:<br>10 g of olivine + 100 ml hydrochloric acid / soaking: 24 h / drying in oven at 130 °C (rusty orange): .4 g + 50 cc of transparent polyester resin + 1% of catalyst / manual grinding / moulding / hardening (medium beige-orange) / irradiated with electrons at 155,082 rad<br>(followed at «beige-orange») |
| orange-brown | 6507 | mineral : pentlandite[102]<br>rock : dark iron-grey, with silver and golden yellow metallic briliance<br>powder : dark iron-grey (pronounced brown tone)<br>origin : Inco Co., Sudbury, Ontario<br><br>production process:<br>(followed from «dark brown»)<br>2 g of pentlandite + 2 g of sodium carbonate / 0↑1100 °F + 1 h at 1100 °F<br>(followed at «dark iron-grey») |
| orange-brown | 6508 | mineral : peridotite<br>rock : medium grey<br>powder : medium brownish grey (green reflection)<br>origin : Thetford Mines, Québec<br><br>production process:<br>0↑1900 °F |
| | | mineral : pyrite<br>rock : pale brass-yellow, with metallic briliance)<br>powder : brownish grey (with golden yellow particles)<br>provenance: Noranda Mines, Noranda, Abitibi, Québec |

| | | |
|---|---|---|
| orange-brown | 6509 | <u>production process:</u><br>5 g of pyrite + 20 ml sulphuric acid / soaking: 3 d. / drying on hot plate |
| orange-brown | 6510 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>0†1900 °F (dark iron-grey): .50 g + 50 ml nitric acid / soaking: 2 wk. / drying on hot plate (blackish brown) / irradiated with electrons at 162,431 rad |
| orange-brown | 6511 | mineral : rutile<br>powder : dark brown (orange-red reflection)<br>origin : North Stradbroke Island, Queensland, Australia<br><br>mineral : sulphur<br>rock : brilliant yellow<br>powder : brilliant yellow<br>origin : unknown<br><br><u>production process:</u><br>2 g of rutile + 2 g of sulphur / 1300 °F / 1 h |
| orange-brown | 6512 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>mineral : chrome<br>powder : light grey, with metallic brilliance<br><br><u>production process:</u><br>1 g of shale + 1 g of chrome / 2000 °F / 45 min. |
| orange-brown | 6513 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>(followed from «pinkish orange-beige [brown tone]»)<br>rock irradiated with gamma rays at 424.7 Mrad |

| | | |
|---|---|---|
| | | mineral : smaltite[25], variety of skutterudite<br>rock : dark iron-grey, with silver metallic brilliance<br>powder : dark grey<br>origin : Cobalt, Ontario |
| | | <u>production process:</u> |
| orange-brown | 6514 | 0↑1900 °F (dark brown): .30 g + 50 ml nitric acid / soaking: 2 wk. / drying on hot plate (reddish brown) / irradiated with electrons at 162,431 rad |
| | | mineral : obsidian<br>rock : very dark smoky grey, almost black<br>powder : light grey<br>origin : Arkansas, United States |
| | | <u>production process:</u><br>(followed from «light greyish brown») |
| orange-brown | 6515 | 2 g of obsidian + 2 g of sodium carbonate / 0↑1400 °F + 1 h at 1400 °F[749]<br>(followed at «light grey») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |
| | | <u>production process:</u><br>(followed from «rusty orange) |
| orange-brown<br>↓ | 6516 | 0↑1400 °F (pinkish beige more accentuated and pinkish than «pinkish beige»): 5 g + 25 ml nitric acid / soaking: 3 d. / drying on hot plate |
| orange-brown still more orange<br>↓ | 6517 | 0↑1600 °F (pinkish beige [light grey tone] lighter than «pinkish beige [grey tone]»): 5 g + 25 ml nitric acid / soaking: 3 d. / drying on hot plate |
| orange-brown | 6518 | 0↑1800 °F (pinkish beige [grey tone slightly more accentuated] a bit lighter than «pinkish beige [grey tone]»): 5 g + 25 ml nitric acid / soaking: 3 d. / drying on hot plate |
| | | <u>production process:</u><br>(followed from «dark chamois») |
| orange-brown | 6519 | 0↑1600 °F (pinkish beige [light grey tone] lighter than «pinkish beige [grey tone]»): 5 g + 25 ml |

| | | |
|---|---|---|
| | | hydrochloric acid / soaking: 3 d. / drying on hot plate<br>(followed at «orange») |
| orange-brown [very strong orange tone] | 6520 | mineral : hypersthene<br>rock : black<br>powder : medium brownish grey<br>origin : Lac Saint-Jean, Québec<br><br>production process:<br>2 g of hypersthene + 20 ml hydrochloric acid / soaking: 3 d. / drying on hot plate |
| orange-brown a bit darker than «orange-brown» | 6521 | mineral : crocidolite<br>rock : dark greyish blue<br>powder : pale greyish blue<br>origin : Griqualand district, South Africa<br><br>production process:<br>2 g of crocidolite + 2 g of sodium carbonate / 0↑1300 °F + 1 h at 1300 °F (brown ochre [reddish orange tone]) / irradiated with gamma rays at 190.22 Mrad<br>(followed at «medium pinkish brown») |
| orange-brown darker than «orange-brown» | 6522 | mineral : almandite<br>rock : dark brownish red<br>powder : medium brownish red<br>origin : Gore Mountain, Warren county, New York state, United States<br><br>production process:<br>4 g of almandite + 80 ml hydrochloric acid / soaking: 2 wk. / drying on hot plate (orange-brown) / irradiated with gamma rays at 70.4 Mrad<br>(followed at «dark chocolate-brown [light rusty orange reflection]») |
| orange-brown much more pale than «medium orange-brown» | 6523 | mineral : hypersthene<br>rock : black<br>powder : medium brownish grey<br>origin : Lac Saint-Jean, Québec<br><br>production process:<br>1000 °C / 1 h (medium orange-brown) / powder irradiated with gamma$^{239}$ rays at 64.7 Mrad<br>(followed at «chocolate-brown [orange tone]») |
| | | mineral : clay |

1217

| | | |
|---|---|---|
| | | block : pale greyish green<br>powder : pale greyish green<br>origin : bank of St.-Lawrence river at the rear of the Miguasha Museum, Gaspésie, Québec<br><br>mineral : sulphur<br>rock : brilliant yellow<br>powder : brilliant yellow<br>origin : unknown |
| orange-brown a bit more pale than «medium orange-brown» | 6525 | <u>production process:</u><br>2 g of clay + 2 g of sulphur / 1300 °F / 1 h (medium and vivid brownish orange) / irradiated with electrons at 302,831 rad[36] |
| | | mineral : halite[41]<br>rock : colourless<br>powder : colourless<br>origin : Seleine Mine, Iles-de-la-Madeleine, Québec |
| orange-brown a bit less orange and more pale than «medium orange-brown» | 6525.1 | <u>production process:</u><br>2 g of halite + 2 g of sodium carbonate / 0↑1300 °F + 1 h at 1300 °F (medium orange-brown) / irradiated with gamma rays at 64.7 Mrad (followed at «light milky chocolate-brown») |
| | | mineral : uraninite<br>rock : medium chocolate-brown (red Bordeau tone)<br>powder : medium milky chocolate-brown<br>origin : Yellowknife, Canada |
| orange-brown a bit more pale than «medium orange-brown» | 6526 | <u>production process:</u><br>0↑1900 °F (medium orange-brown) / powder irradiated with gamma[239] rays at 64.7 Mrad (followed at «orange-brown darker, more intense and luminous than "medium orange-brown"») |
| | | mineral : hypersthene<br>rock : black<br>powder : medium brownish grey<br>origin : Lac Saint-Jean, Québec<br><br>mineral : sulphur<br>rock : brilliant yellow<br>powder : brilliant yellow<br>origin : unknown |

| | | |
|---|---|---|
| brown (light orange tone), lighter than «medium orange-brown» | 6527 | production process:<br>2 g of hypersthene + 2 g of sulphur / 1300 °F / 1 h<br>(followed at «dark chocolate-brown [red tone]») |
| medium orange-brown | 6527.1 | mineral : bauxite<br>powder : pinkish beige, mat<br>origin : Alcan Company, French Guyana<br><br>production process:<br>1 g of bauxite + 5 g of pyrex / manual grinding / heating: 5 °C per min. 0↑1245 °C + maintenance during 1 h / cooling: 5 °C per min. until ambient temperature is reached / the entity is done in ambient air |
| medium orange-brown | 6528 | mineral : actinolite<br>rock : light and cold evergreen<br>powder : light grey (light green tone)<br>origin : erratic block found at Saint-Philémon near Dorchester, Québec<br><br>production process:<br>3 g of actinolite + 50 ml of hydrochloric acid / soaking: 2 wk. / separation of the liquid and the solid / drying on hot plate / colour of the solid[539] |
| medium orange-brown | 6529 | production process:<br>2 g of actinolite + 2 g of sodium carbonate / 0↑1900 °F + 1 h at 1900 °F (bluish green) / irradiated with gamma rays at 64.7 Mrad<br>(followed at «greyish brown [pink tone]») |
| medium orange-brown<br>↓<br>darker and more intense orange-brown | 6530<br><br>6531 | mineral : asbestos[4]<br>rock : dark grey (green reflection)<br>powder : light grey (green reflection)<br>origin : Asbestos Corporation Ltd., Thetford Mines, Québec<br><br>production process:<br>2 g of asbestos + 2 g of sodium carbonate / 1900 °F / 1 h (green [with a few brown particles]) / irradiated with gamma rays at:<br>190.22 Mrad<br>550.22 Mrad |
| | | mineral : crocidolite<br>rock : dark greyish blue |

1219

| | | |
|---|---|---|
| | | powder : pale greyish blue<br>origin : Griqualand district, South Africa<br><br>production process:<br>(followed from «orange-brown») |
| medium orange-brown | 6532 | 2 g of crocidolite + 2 g of sodium carbonate / 0↑1600 °F + 1 h at 1600 °F<br>(followed at «light khaki-green») |
| | | mineral : armenite<br>rock : light grey<br>powder : very light grey<br>origin : Abitibi, Québec<br><br>mineral : sulphur<br>rock : brilliant yellow<br>powder : brilliant yellow<br>origin : unknown<br><br>production process: |
| medium orange-brown | 6533 | 2 g of armenite + 2 g of sulphur / 1300 °F / 1 h |
| | | mineral : beryl<br>rock : intense grass-green, slightly translucid<br>powder : greenish grey<br>origin : unknown<br><br>production process:<br>(followed from «green [orange-brown tone] or orange-brown [green tone]»)<br>1 g of beryl + 1 cc of white transparent synthetic enamel paint used for the car / manual grinding / application on a piece of steel sheet used for the car's body measuring 1" x 1" (khaki-green) / irradiated with gamma rays at: |
| medium orange-brown<br>↓ | 6534 | 201.6 Mrad |
| orange-brown a bit darker than «medium orange-brown» | 6535 | 247.6 Mrad<br><br>(followed at «dark chocolate-brown [rusty orange tone]») |
| | | mineral : calcite<br>rock : light pink<br>powder : pinkish white<br>origin : Huddersfield district, Pontiac county, Québec<br><br>production process:<br>(followed from «light rusty orange») |
| medium orange- | 6536 | 0↑1800 °F (medium brownish grey): 2 g + 80 ml |

1220

| | | |
|---|---|---|
| brown | | nitric acid / soaking: 2 wk. / drying on hot plate (brown [old rose tone]) / irradiated with gamma rays at 430.4 Mrad |
| medium brown (light orange tone) | 6537 | mineral : cerite<br>rock : dark brownish grey<br>powder : light grey (light brown tone)<br>origin : Jamestown, Boulder county, Colorado, United States<br><br>production process:<br>2 g of cerite + 2 g of sodium carbonate / 0↑1500 °F + 1 h at 1500 °F (dark grass-green) / irradiated with gamma rays at 64.7 Mrad (followed at «mixture of particles: grey / milky chocolate-brown / milky pinkish chocolate-brown») |
| medium brown (light orange tone) | 6538 | production process:<br>2 g of cerite + 2 g of sodium carbonate / 0↑1500 °F + 1 h at 1500 °F (dark grass-green) / irradiated with electrons at 162,431 rad |
| medium orange-brown | 6539 | mineral : chalcocite<br>rock : dark iron-grey<br>powder : dark iron-grey<br>origin : Butte, Montana, United States<br><br>production process:<br>(followed from «yellowish green» and «greenish yellow»)<br>4 g of chalcocite + 100 ml hydrochloric acid / soaking: 4 years / separation of the liquid and the solid / drying on hot plate / colour of the liquid[750] |
| medium orange-brown | 6540 | production process:<br>4 g of chalcocite + 100 ml hydrochloric acid / soaking: 4 years / drying on hot plate / colour of the solid[750] |
| medium orange-brown | 6541 | mineral : chalcopyrite<br>powder : dark grey (light green tone)<br>origin : Centre de recherche des Mines Noranda in Montréal, Québec<br><br>production process:<br>2 g of chalcopyrite + 2 g of sodium carbonate / 0↑1600 °F + 1 h at 1600 °F (mossy chocolate-brown [pink tone]) / irradiated with gamma rays at 64.7 Mrad<br>(followed at «mixture of particles: chocolate-brown / grey / beige») |
| | | mineral : zinc concentrate grilled at 1000 °C |

| | | |
|---|---|---|
| medium orange-brown | 6542 | (ZnO-FeO)(SO₄)<br>powder : reddish brown<br>origin : Zinc Electrolytic du Canada Co., Québec<br><br>production process:<br>4 g of zinc concentrate + 50 ml nitric acid / soaking: 4 wk. / drying on hot plate |
| medium orange-brown<br>↓<br>orange-brown a bit darker | 6543<br><br>6544 | mineral : dolomite<br>rock : light grey<br>powder : light grey<br>origin : Shefferville, Ungava, Québec<br><br>production process:<br>(followed from «greyish brown darker than "greyish brown"»)<br>rock irradiated with gamma[228] rays at:<br>423.984 Mrad<br><br>482.984 Mrad |
| medium orange-brown | 6545 | mineral : solid epidote<br>rock : brownish green<br>powder : brownish green<br>origin : James Bay, Québec<br><br>production process:<br>(followed from «orange-beige»)<br>0↑1700 °F (dark reddish brown): 1 g + 40 ml hydrochloric acid /soaking: 1 wk. / separation of the liquid and the solid / natural drying (colour of the solid: rusty orange) / irradiated with electrons at 305,200 rad[73] |
| medium orange-brown | 6546 | mineral : clay<br>block : pale greyish green<br>powder : pale greyish green<br>origin : bank of St.-Lawrence river at the rear of the Miguasha Museum, Gaspésie, Québec<br><br>production process:<br>(followed from «creamy beige [light orange-pink tone] darker than "dark creamy beige [orange-pink tone]"»)<br>0↑1900 °F (medium brown [orange-red tone]): 1 g + 50 ml sulphuric acid / soaking: 2 wk. / drying on hot plate (dark creamy beige [light orange-pink tone]) / irradiated with gamma[239] rays at 424.7 Mrad |

| | | |
|---|---|---|
| medium orange-brown | 6547 | mineral : halite[41]<br>rock : colourless<br>powder : colourless<br>origin : Seleine Mine, Iles-de-la-Madeleine, Québec<br><br>production process:<br>(followed from «beige»)<br>2 g of halite + 2 g of sodium carbonate / 0↑1300 °F + 1 h at 1300 °F<br>(followed at «greyish cream [with blue stains]») |
| medium orange-brown | 6548 | mineral : hornblende<br>rock : medium evergreen (light grey tone), with a vitreous brilliance<br>powder : medium cold grey (light green tone)<br>origin : Abitibi, Québec<br><br>production process:<br>(followed from «dark orange-beige»)<br>0↑2000 °F (dark orange-beige) / irradiated with gamma rays at 484.704 Mrad |
| medium orange-brown | 6549 | mineral : hypersthene<br>rock : black<br>powder : medium brownish grey<br>origin : Lac Saint-Jean, Québec<br><br>production process:<br>1000 °C / 1 h |
| medium orange-brown | 6550 | mineral : labrador<br>rock : blackish grey<br>powder : medium grey<br>origin : Lac Saint-Jean, Québec<br><br>production process:<br>powder irradiated with gamma rays at 64.7 Mrad<br>(followed at «medium greyish brown») |
| medium orange-brown | 6551 | mineral : mussel shell or calcium carbonate<br>shell : dark indigo-blue (violet tone)<br>powder : white<br>origin : St.-Lawrence river, Baie-des-Chaleurs, Gaspésie, Québec<br><br>production process:<br>.50 g of powder + 50 ml nitric acid / soaking: 2 wk. / drying on hot plate (very, very light orange) / irradiated with gamma rays at:<br>70.4 Mrad |

| | | |
|---|---|---|
| ↓ medium orange-brown | 6552 | 430.4 Mrad |
| medium orange-brown | 6553 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «beige»)<br>2 g of ochre + 2 g of sodium carbonate /<br>0↑1500 °F + 45 min. at 1500 °F<br>(followed at «brown») |
| medium orange-brown | 6554 | mineral : olivine<br>rock : light grey, crystalline<br>powder : very light grey<br>origin : Mont Albert, Gaspésie, Québec<br><br>production process:<br>0↑1800 °F (reddish orange): 1 g + 80 ml hydrochloric acid / soaking: 2 wk. / drying on hot plate (beige [light orange tone]) / irradiated with gamma[239] rays at 424.7 Mrad |
| medium orange-brown | 6555 | mineral : olivine<br>rock : light grey, cr stalline<br>powder : very light grey<br>origin : Mont Albert, Gaspésie, Québec<br><br>mineral : sulphur<br>rock : brilliant yellow<br>powder : brilliant yellow<br>origin : unknown<br><br>production process:<br>(followed from «medium orange-beige»)<br>2 g of olivine + 2 g of sulphur / 1300 °F / 1 h (medium orange-beige) / irradiated with gamma rays at 424.7 Mrad[464] |
| medium orange-brown | 6556 | mineral : ochre[128]<br>powder : black<br>origin : Red Mill, in the suburbs of Cap-de-la-Madeleine, Québec<br><br>production process:<br>0↑1000 °F<br>(followed at «brown [reddish orange tone]») |

| | | |
|---|---|---|
| | | mineral : ochre[128]<br>powder : black<br>origin : Red Mill, in the suburbs of Cap-de-la-Madeleine, Québec<br><br>mineral : zirconium silicate<br>powder : white (very light yellow reflection)<br>origin : Sial Company, Québec<br><br><u>production process:</u><br>(followed from «pale greyish brown») |
| medium orange-brown | 6557 | 1 g of ochre + 1 g of zirconium silicate / 0↑1000 °F<br>(followed at «brownish red») |
| | | mineral : ochre[128]<br>powder : black<br>origin : Red Mill, in the suburbs of Cap-de-la-Madeleine, Québec<br><br>mineral : table salt (NaCl)<br>powder : colourless<br>origin : Sifto Company<br><br><u>production process:</u> |
| medium orange-brown | 6558 | 10 g of ochre + 10 g of NaCl / 0↑1000 °F[752]<br>(followed at «brown [reddish orange tone]») |
| | | mineral : uraninite<br>rock : medium chocolate-brown (red Bordeau tone)<br>powder : medium milky chocolate-brown<br>origin : Yellowknife, Canada<br><u>production process:</u> |
| medium orange-brown | 6559 | 0↑1900 °F |
| | | mineral : peridotite<br>rock : medium grey<br>powder : medium brownish grey (green reflection)<br>origin : Thetford Mines, Québec<br><u>production process:</u><br>(followed from «brownish grey more intense than "very pale brownish grey"»)<br>1 g of peridotite + 1 cc of white transparent synthetic enamel paint used for the car / manual grinding / application on a piece of steel sheet used for the car's body measuring 1" x 1" (very pale greenish grey) / irradiated with gamma rays at: |
| medium orange-brown | 6560 | 102.4 Mrad |
| ↓ | | |
| darker orange-brown | 6561 | 201.6 Mrad |

| | | |
|---|---|---|
| | | (followed at «dark brownish green or greenish brown») |
| medium orange-brown [more brown, more pale, without any red tone] | 6562 | production process:<br>(followed from «brown [reddish orange tone] much more pale than "fairly vivid brown [reddish orange tone]"»)<br>0↑2000 °F (fairly vivid brown [reddish orange tone]) / irradiated with gamma[239] rays at 424.7 Mrad |
| medium orange-brown | 6563 | mineral : pyrophillite<br>rock : light beige (grey and pink tones), opaque<br>powder : very light beige (grey and orange-pink tones)<br>origin : Carpentier district, Abitibi, Québec<br><br>production process:<br>(followed from «orange-yellow a bit darker than "medium orange-yellow"»)<br>1 g of pyrophillite + 50 ml nitric acid / soaking: 2 wk. / drying on hot plate (medium and fairly vivid orange-yellow) / irradiated with gamma[239] rays: 424.7 Mrad |
| medium orange-brown | 6564 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 20 ml hydrochloric acid / soaking: 3 d. / drying on hot plate |
| medium orange-brown | 6565 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br>production process:<br>3 g of shale + 25 ml nitric acid / soaking: 24 h / drying on hot plate |
| | | mineral : shale (formation of Sillery[547])<br>rock : dark violet-mars[753]<br>powder : light violet-mars[753]<br>origin : small copper and nickel deposit, in the South-Western area of a mass of serpentinite at 3 km at the West of |

1226

| | | |
|---|---|---|
| | | Saint-Fabien-de-Panet, Québec<br><br>production process:<br>3 g of shale + 25 ml hydrochloric acid / soaking: 5 d. / drying on hot plate |
| medium orange-brown | 6566 | |
| | | mineral : serpentine<br>rock : yellowish green<br>powder : light greenish yellow<br>origin : probably Thetford Mines, Eastern Townships, Québec<br><br>mineral : nickel<br>powder : dark brownish grey, with metallic brilliance<br><br>production process:<br>1 g of serpentine + 1 g of nickel / 2000 °F / 45 min. |
| medium orange-brown | 6567 | |
| | | mineral : serpentine<br>rock : yellowish green<br>powder : light greenish yellow<br>origin : probably Thetford Mines, Eastern Townships, Québec<br><br>production process:<br>(followed from «orange-brown [green reflection]») rock irradiated with gamma rays at 360 Mrad (followed at «blackish brown») |
| medium orange-brown | 6568 | |
| | | mineral : sphalerite[31]<br>rock : honey-yellow<br>powder : pale honey-yellow<br>origin : Fëderal Mine, Lemieux district, Gaspésie, Québec<br><br>production process:<br>2000 °F / 20 min. |
| medium orange-brown | 6569 | |
| | | mineral : spodumene<br>rock : pale green<br>powder : light grey, almost white<br>origin : Québec Lithium Co., Baraute, Abitibi, Gaspésie, Québec<br><br>production process:<br>(followed from «mixture of particles: orange-brown / blackish grey or blackish brown»)<br>0↑1900 °F (medium brownish grey): .20 g + 50 ml sulphuric acid / soaking: 2 wk. / drying on hot plate (light grey) irradiated with gamma[239] rays |
| medium orange-brown | 6570 | |

| | | |
|---|---|---|
| | | at 424.7 Mrad |
| medium brown<br>(light orange tone) | 6571 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br><u>production process:</u><br>2 g of tremolite + 2 g of sulphur / 1300 °F / 1 h |
| medium orange-brown | 6572 | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><br><u>production process:</u><br>(followed from «medium brownish beige»)<br>1 g of vesuvianite + 1 g of sulphur / 1700 °F / 1 h (grey) / irradiated with gamma rays at 425.65 Mrad |
| | 6573 | mineral : zircon<br>rock : grey and brown<br>origin : Mont Saint-Hilaire, Québec |
| medium orange-brown | 6574 | <u>production process:</u><br>(followed from «chocolate-brown [orange reflection]»)<br>1500 °F / 1 h (dark chocolate-brown) / irradiated with electrons at 305,200 rad[73] |
| orange-brown a bit darker than «medium orange-brown» | 6575 | mineral : crocidolite<br>rock : dark greyish blue<br>powder : pale greyish blue<br>origin : Griqualand district, South Africa<br><br><u>production process:</u><br>(followed from «brown»)<br>2 g of crocidolite + 2 g of sodium carbonate / 0↑1800 °F + 1 h at 1800 °F (light khaki-green) / / irradiated with gamma[239] rays at 550.22 Mrad |

1228

| | | |
|---|---|---|
| orange-brown a bit darker than «medium orange-brown» | 6576 | mineral : anorthosite<br>rock : dark grey<br>powder : medium grey<br>origin : Jonquière, Lac Saint-Jean, Québec<br><br>production process:<br>(followed from «medium greyish beige»)<br>0↑1900 °F (medium brown): .30 g + 50 ml sulphuric acid / soaking: 2 wk. / separation of the liquid and the solid / drying on hot plate (colour of the solid: medium brownish grey) / irradiated with gamma rays at 424.7 Mrad |
| orange-brown a bit darker than «medium orange-brown» | 6577 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>2 g of ochre + 2 g of sodium carbonate / 0↑1500 °F + 45 min. at 1500 °F (medium orange-brown) / irradiated with gamma rays at 63.88 Mrad (followed at «greyish brown» or «brownish grey») |
| orange-brown a bit darker than «medium orange-brown» | 6578 | mineral : uraninite<br>rock : medium chocolate-brown (red Bordeau tone)<br>powder : medium milky chocolate-brown<br>origin : Yellowknife, Canada<br><br>mineral : sulphur<br>rock : brilliant yellow<br>powder : brilliant yellow<br>origin : unknown<br><br>production process:<br>2 g of uraninite + 2 g of sulphur / 1300 °F / 1 h (medium brown [reddish orange tone]) / irradiated with gamma[81,239] rays at 424.7 Mrad |
| | | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown |

| | | |
|---|---|---|
| orange-brown a bit darker than «medium orange-brown» | 6579 | production process:<br>2 g of tremolite + 2 g of sulphur / 1300 °F / 1 h (medium brown [light orange tone]) / irradiated with electrons at 162,431 rad |
| orange-brown darker than «medium orange-brown» | 6580 | mineral : actinolite<br>rock : light and cold evergreen<br>powder : light grey (light green tone)<br>origin : erratic block found at Saint-Philémon near Dorchester, Québec<br><br>production process:<br>3 g of actinolite + 50 ml hydrochloric acid / soaking: 2 wk. / separation of the liquid and the solid / drying on hot plate (colour of the liquid: rusty orange) / irradiated with gamma rays at 64.7 Mrad<br>(followed at «dark greyish brown») |
| darker orange-brown and more intense and luminous [more accentuated orange tone] than «medium orange-brown» | 6581 | mineral : uraninite<br>rock : medium chocolate-brown (red Bordeau tone)<br>powder : medium milky chocolate-brown<br>origin : Yellowknife, Canada<br><br>production process:<br>(followed from «orange-brown more pale than "medium orange-brown"»)<br>0↑1900 °F (medium orange-brown) / powder irradiated with gamma²³⁹ rays at 424.7 Mrad |
| orange-brown darker | 6582 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>production process:<br>2 g of tremolite + 2 g of sulphur / 1300 °F / 1 h |

| | | |
|---|---|---|
| than «medium orange -brown» [lightened orange tone] | | (medium brown [light orange tone]) / irradiated with gamma[81] rays at 424.7 Mrad |
| orange-brown [between «medium orange-brown» and «dark orange-brown»] | 6583 | mineral : chalcocite<br>rock : dark iron-grey<br>powder : dark iron-grey<br>origin : Butte, Montana, United States<br><br><u>production process:</u><br>(followed from «mixture of particles: light green / light yellowish beige»)<br>0↑1900 °F (dark iron-grey): 1 g + 80 ml nitric acid / soaking: 2 wk. / separation of the liquid and the solid / natural drying (colour of the liquid: greenish blue[24]) / irradiated with gamma rays at 424.7 Mrad |
| orange-brown [between «medium orange-brown» and «dark orange-brown»] | 6584 | mineral : goethite[106]<br>powder : rusty orange<br>origin : Red Mill, in the suburbs of Cap-de-la-Madeleine, Québec<br><br><u>production process:</u><br>(followed from «blackish chocolate-brown»)<br>2 g of goethite + 20 ml of a tartric[35] acid solution / soaking: 3 d. / drying on hot plate (dark chocolate-brown [grey tone]) / irradiated with gamma[239] rays at 424.7 Mrad |
| orange-brown [between «medium orange-brown» and «dark orange-brown»] | 6585 | mineral : haematite<br>rock : medium chocolate-brown<br>powder : medium chocolate-brown<br>origin : Nouveau Québec, Québec<br><br><u>production process:</u><br>(followed from «dark reddish brown»)<br>0↑1800 °F (dark violet-brown): 4 g + 80 ml hydrochloric acid / soaking: 2 wk. / drying on hot plate (dark brown [light rusty tone]) / irradiated with gamma[239] rays at 424.7 Mrad |
| | | mineral : hornblende<br>rock : medium evergreen (light grey tone), with a vitreous brilliance<br>powder : medium cold grey (light green tone)<br>origin : Abitibi, Québec |

1231

| | | |
|---|---|---|
| orange-brown [between «medium orange-brown» and «dark orange-brown»] | 6586 | production process: (followed from «orange-brown [khaki-green tone]») 3 g of hornblende + 25 ml hydrochloric acid / soaking: 24 h / drying on hot plate (medium orange-brown [light green tone, khaki-green type]) / irradiated with gamma[239] rays at 424.7 Mrad |
| | | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>mineral : sulphur<br>rock : brilliant yellow<br>powder : brilliant yellow<br>origin : unknown |
| orange-brown a bit darker than «orange-brown [between "medium orange-brown" and "dark orange-brown"]» | 6587 | production process: 2 g of pentlandite + 2 g of sulphur / 1300 °F / 1 h (reddish orange [brown tone], between «medium reddish orange [brown tone]» and «dark reddish orange [brown tone]») / irradiated with gamma[81,239] rays at 424.7 Mrad |
| | 6588 | mineral : iron oxide[754]<br>powder : dark chocolate-brown<br>origin : unknown |
| brown (light orange tone) a bit more pale than «dark orange-brown» | 6589 | production process: powder irradiated with gamma rays at 484.704 Mrad[433,681] |
| | | mineral : magnetite<br>rock : dark grey, with metallic brilliance<br>powder : dark grey<br>origin : Fosse du Labrador, Québec |
| orange-brown more pale and mat than «dark orange-brown» | 6590 | production process: 2 g of magnetite + 2 g of sodium carbonate / 0↑1500 °F + 1 h at 1500 °F (dark orange-brown) / irradiated with gamma[239] rays at 63.88 Mrad (followed at «pale brownish grey») |
| orange-brown lighter than «dark | 6591 | production process: 3 g of magnetite + 80 ml hydrochloric acid / soaking: 2 wk. / drying on hot plate (dark orange- |

| | | |
|---|---|---|
| orange-brown» | | brown) / irradiated with gamma rays at 70.4 Mrad (followed at «brownish orange») |
| dark orange-brown | 6592 | mineral : asbestos[4]<br>rock : dark grey (green reflection)<br>powder : light grey (green reflection)<br>origin : Asbestos Corporation Ltd., Thetford Mines, Québec<br><br>production process:<br>5 g of asbestos + 80 ml nitric acid / soaking: 2 wk. / drying on hot plate |
| dark orange-brown | 6593 | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br>production process:<br>(followed from «brown [violet-red tone] lighter than "dark brown [violet-red tone]"») 250 g of crocidolite + 1650 ml hydrochloric acid in a 2000 ml becher or crocidolite entirely covered with hydrochloric acid in a vertical container / soaking: 1 wk. / drying on hot plate (formation of 2 layers of superimposed colours, the one at the bottom being: dark green [light yellow tone]): 2 g + 2 g of sulphur / 1300 °F / 1 h (dark crimson—brown) / irradiated with gamma[239] rays at 555.92 Mrad |
| dark orange-brown | 6594 | mineral : zinc concentrate grilled at 1000 °C $(ZnO\text{-}FeO)(SO_4)$<br>powder : reddish brown<br>origin : Zinc Electrolytic du Canada Co., Québec<br><br>production process:<br>4 g of concentrate + 50 ml hydrochloric acid / soaking: 4 wk. / drying on sand bath |
| | | mineral : clay<br>block : pale greyish green<br>powder : pale greyish green<br>origin : bank of St.-Lawrence river at the rear of the Miguasha Museum, Gaspésie, Québec |

| | | |
|---|---|---|
| dark orange-brown | 6595 | <u>production process:</u><br>(followed from «reddish orange much more intense than "medium reddish orange"»)<br>0↑1900 °F (medium brown [orange-red tone]): 1 g + 50 ml hydrochloric acid / soaking: 2 wk. / drying on hot plate (medium rusty orange) / irradiated with gamma rays at 424.7 Mrad |
| dark orange-brown | 6596 | mineral : biotite gneiss<br>rock : blackish grey, golden vitreous brilliance<br>powder : dark grey<br>origin : Grenville geological province, Québec<br><u>production process:</u><br>12 g of gneiss + 40 ml hydrochloric acid / soaking: 22 d. / separation of the liquid and the solid / natural drying (colour of the solid: yellowish green) / irradiated with gamma rays at 64.7 Mrad<br>(followed at «dark chocolate-brown») |
| dark orange-brown (localized green reflections) | 6596.1 | mineral : galena<br>rock : dark grey, with metallic brilliance<br>powder : dark grey, with metallic briliance<br>origin : Trail, British Columbia<br><u>production process:</u><br>.45 g of galena + 6.50 g of powdered glass (spruce pine batch) / manual grinding / deposited on a ceramic plate at the state of a biscuit / heating in a furnace 0↑1000 °C in ambient air<br>(followed at «areas: dark green / dark brown [caramel tone]») |
| dark orange-brown | 6597 | mineral : almandite<br>rock : dark brownish red<br>powder : medium brownish red<br>origin : Gore Mountain, Warren county, New York state, United States<br><u>production process:</u><br>4 g of almandite + 80 ml nitric acid / soaking: 2 wk. / drying on hot plate (medium rusty orange) / irradiated with gamma[81,239] rays at 424.7 Mrad |
| | | mineral : sandstone<br>rock : medium pinkish brown (light violet tone)<br>powder : medium pinkish brown (light violet tone)<br>origin : at the rear of Percé, Gaspésie, Québec |

1234

| | | |
|---|---|---|
| dark orange-brown | 6598 | <u>production process:</u><br>(followed from «rusty orange»)<br>0↑1900 °F (medium rusty orange): 2 g + 80 ml hydrochloric acid / soaking: 2 wk. / drying on hot plate (medium rusty orange [red tone]) / irradiated with gamma[239] rays at 424.7 Mrad |
| dark orange-brown | 6599 | mineral : magnetite<br>rock : dark grey, with metallic brilliance<br>powder : dark grey<br>origin : Fosse du Labrador, Québec<br><br><u>production process:</u><br>(followed from «milky orange chocolate-brown»)<br>2 g of magnetite + 2 g of sodium carbonate / / 0↑1500 °F + 1 h at 1500 °F<br>(followed at «mixture of particles: orange / brown») |
| dark orange-brown | 6600 | <u>production process:</u><br>3 g of magnetite + 80 ml hydrochloric acid / soaking: 2 wk. / drying on hot plate |
| dark orange-brown | 6601 | mineral : ochre[128]<br>powder : black<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br><u>production process:</u><br>1 g of ochre + 3 g of halite / 0↑1000 °F<br>(followed at «brown [reddish orange tone]») |
| dark orange-brown | 6602 | <u>production process:</u><br>1 g of ochre + 1 g of halite / 0↑1000 °F<br>(followed at «brown [reddish orange tone]») |
| dark orange-brown | 6603 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br><u>production process:</u><br>4 g of pentlandite + 80 ml hydrochloric acid / soaking: 2 wk. / drying on hot plate (medium rusty orange [brown tone]) / irradiated with |

1235

| | | |
|---|---|---|
| | | gamma[239,538] rays at 430.4 Mrad |
| dark orange-brown | 6604 | mineral : tremolite<br>rock : medium brown (evergreen tone)<br>powder : greyish beige<br>origin : Tetreault Mine, Montauban, Portneuf county, Québec<br><br>production process:<br>(followed from «brown»)<br>0↑1900 °F (orange-beige): .30 g + 50 ml nitric acid / soaking: 2 wk. / drying on hot plate (medium pinkish beige [grey tone]) / irradiated with gamma rays at 424.7 Mrad |
| orange-brown a bit darker than «dark orange-brown» | 6604.1 | animal : dried pork blood<br>powder : dark brown (orange-red tone)<br><br>production process:<br>irradiated with gamma rays at 2.26 Mrad |
| orange-brown darker than «dark orange-brown» | 6605 | mineral : magnetite<br>rock : dark grey, with metallic brilliance<br>powder : dark grey<br>origin : Fosse du Labrador, Québec<br><br>production process:<br>(followed from «dark iron-grey»)<br>0↑1900 °F (dark chocolate-brown): 1 g + 50 ml sulphuric acid / soaking: 2 wk. / drying on hot plate (very dark brown, almost black) / irradiated with gamma rays at 430.4 Mrad |
| orange-brown darker than «dark orange-brown» | 6606 | mineral : smaltite[25], variety of skutterudite<br>rock : dark iron-grey, with silver metallic brilliance<br>powder : dark grey<br>origin : Cobalt, Ontario<br><br>production process:<br>0↑1900 °F (dark brown) / irradiated with gamma rays at 64.7 Mrad<br>(followed at «pinkish brown lighter and more pink than "dark pinkish brown"») |
| | | mineral : crocidolite<br>rock : dark greyish blue<br>powder : pale greyish blue<br>origin : Griqualand district, South Africa |

| | | |
|---|---|---|
| very dark orange-brown | 6607 | <u>production process:</u><br>rock entirely covered with 20 ml hydrochloric acid / soaking: 2 wk. / irradiated with gamma rays at 5.7 Mrad / drying on sand bath, completed on hot plate |
| blackish brown (light orange tone) | 6608 | mineral : goethite[106]<br>powder : rusty orange<br>origin : Red Mill, in the suburbs of Cap-de-la -Madeleine, Québec<br><br><u>production process:</u><br>40 g of goethite + 100 ml phosphoric acid / soaking: 3 wk. / drying on hot plate (still humid)[755] |
| mixture of particles | | |
| orange-brown / white / chocolate brown | 6609 | mineral : tiger-eye agate<br>rock : orange with silky luster, opaque<br>powder : orange with silky luster<br>origin : Africa<br><br><u>production process:</u><br>3 g of agate + 40 ml phosphoric acid / soaking: 2 wk. / drying on hot plate (still humid) / colour of the solid[756] |
| orange brown / blackish grey or blackish brown | 6610 | mineral : spodumene<br>rock : pale green<br>powder : light grey, almost white<br>origin : Québec Lithium Co., Baraute, Abitibi, Gaspésie, Québec<br><br><u>production process:</u><br>0↑1900 °F (medium brownish grey): .20 g + 50 ml sulphuric acid / soaking: 2 wk. / drying on hot plate (light grey) / irradiated with gamma rays at 64.7 Mrad<br>(followed at «medium orange-brown») |
| orange-brown / brown | 6611 | mineral : corundum<br>rock : medium grey<br>powder : light grey<br>origin : Transvaal, Africa<br><br><u>production process:</u><br>(followed from «chocolate-brown [light orange tone]»)<br>2 g of corundum + 2 g of sodium carbonate / 0↑1800 °F + 1 h at 1800 °F<br>(followed at «orange-brown») |

| | | |
|---|---|---|
| medium brown (light orange tone) / light orange (chamois tone) | 6612 | mineral : peridotite<br>rock : medium grey<br>powder : medium brownish grey (green reflection)<br>origin : Thetford Mines, Québec<br><br>production process:<br>2 g of peridotite + 2 g of sodium carbonate / 0↑1500 °F + 1:30 h at 1500 °F (reddish orange-beige) / irradiated with gamma rays at 64.7 Mrad[757]<br>(followed at «dark chocolate-brown») |
| orange-brown (pinkish lilac tone) | | |
| medium orange-brown (light pinkish lilac reflection) | 6613 | mineral : wilsonite, local variety of scapolite or wernerite<br>rock : violet (grey tone)<br>powder : light grey (lilac tone)<br>origin : Tetreault Mine, Montauban, Portneuf county, Québec<br><br>production process:<br>(followed from «orange [light pinkish lilac reflection]»)<br>rock irradiated with gamma rays at 602.804 Mrad |
| orange-brown (green tone) | | |
| orange-brown (green reflection) | 6614 | mineral : serpentine<br>rock : yellowish green<br>powder : light greenish yellow<br>origin : probably Thetford Mines, Eastern Townships, Québec<br><br>production process:<br>(followed from «olive-green which becomes more accentuated and darkens towards "blackish green"»)<br>rock irradiated with gamma rays at 287.3 Mrad |
| orange-brown (green tone) | 6615 | mineral : spodumene<br>rock : pale green<br>powder : light grey, almost white<br>origin : Québec Lithium Co., Baraute, Abitibi, Gaspésie, Québec<br><br>production process:<br>2 g of spodumene + 80 ml nitric acid / soaking: 2 wk. / separation of the liquid and the solid / drying on hot plate (colour of the liquid: yellowish green) / irradiated with gamma rays at |

| | | |
|---|---|---|
| | | 424.7 Mrad[81,239] |
| medium orange-brown (light green tone) | 6616 | mineral : sulphur<br>rock : brilliant yellow<br>powder : brilliant yellow<br>origin : unknown<br><br>mineral : asbestos[4]<br>rock : dark grey (green reflection)<br>powder : light grey (green reflection)<br>origin : Asbestos Corporation Ltd., Thetford Mines, Québec<br><br>production process:<br>(followed from «light grass-green»)<br>.50 g of asbestos + .50 g of sulphur (very light pastel grass-green) / irradiated with gamma[239] rays: 614.204 Mrad[509,669] |
| medium orange-brown (light green tone [khaki-green type]) | 6617 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 25 ml hydrochloric acid / soaking: 24 h / drying on hot plate |
| medium orange-brown (very light green tone) | 6618 | production process:<br>.3 g of hornblende + 50 cc of transparent polyester resin + 1% of catalyst / manual grinding / mouiding / hardening (brownish grey [very, very light green tone]) / irradiated with gamma rays at 11.4 Mrad |
| orange-brown (light green tone [khaki-green type] a bit more intense than «medium orange-brown (light green tone)» | 6619 | production process:<br>3 g of hornblende + 25 ml hydrochloric acid / soaking: 24 h / drying on hot plate (medium orange-brown [light green tone, khaki-green type]) / irradiated with gamma[239] rays at 64.7 Mrad<br><br>(followed at «orange-brown») |
| mixture of particles | | |
| | | mineral : galena<br>rock : dark grey, with metallic brilliance<br>powder : dark grey, with metallic brilliance<br>origin : Trail, British Columbia |

| | | |
|---|---|---|
| orange-brown (green tone) / yellow / orange | 6620 | mineral : cement[1138]<br>powder : white<br><br><u>production process:</u><br>(followed from «iron-grey»)<br>1 g of powdered galena is integrated to a mass of cement of 27.40 g + 13 cc of water / manual grinding / moulding / hardening / addition of 5 g of galena at the surface of the piece of dried cement / 0↑1600 °F[280,758,759]<br>(followed at «dark chocolate-brown») |
| orange-brown (green tone) / yellow / orange | 6621 | <u>production process:</u><br>(followed from «metallic grey»)<br>27.40 g of cement + 13 cc of water / manual grinding / moulding / 1 g of powdered galena is immediately deposited on the surface of a humid piece of cement / hardening / addition of 5 g of galena at the surface of a dried piece of cement / 0↑1600 °F[280,758,759]<br>(followed at «dark chocolate-brown») |
| orange-brown (yellow tone) | | |
| medium orange-brown (yellow tone and very, very light green reflection) | 6622 | mineral : sphalerite[31]<br>rock : honey-yellow<br>powder : pale honey-yellow<br>origin : Fédéral Mine, Lemieux district, Gaspésie, Québec<br><br><u>production process:</u><br>(followed from «yellowish brown more intense than "medium yellowish brown"»)<br>80 g of sphalerite + 100 ml hydrochloric acid / soaking: 5 months / natural drying / irradiated with gamma[239] rays at 424.7 Mrad |
| brown (pinkish orange tone) | | |
| | | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br><u>production process:</u><br>0↑1300 °F (brick-orange): 1 g + 1 cc of white opaque printing ink / mechanical grinding / superimpositions on a piece of white glazed paper (light orange-brown [pink tone]) / irradiated with gamma rays at: |

1240

| | | |
|---|---|---|
| pinkish orange-brown a bit lighter than «light pinkish orange-brown» ↓ | 6623 | 11.4 Mrad[89] |
| pinkish orange-brown still a bit lighter than «light pinkish orange-brown» | 6624 | 17.91 Mrad[760] |
| pinkish orange-brown lighter than «pinkish orange-brown» | 6625 | mineral : almandite<br>rock : dark brownish red<br>powder : medium brownish red<br>origin : Gore Mountain, Warren county, New York state, United States<br><br><u>production process:</u><br>2 g of almandite + 2 g of sodium carbonate / 0↑1500 °F + 30 min. at 1500 °F (brown [tends towards olive-green]) / irradiated with gamma rays at 64.7 Mrad<br>(followed at «mixture of particles: brown [orange-pink tone] / grey / white») |
| orange-brown (very light pink tone) a bit more pale and less orange than «medium pinkish orange-brown» | 6626 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br><u>production process:</u><br>0↑1400 °F / slow cooling in furnace (indian red[107]): .10 g + 1.50 g of feldspar (medium brown [pinkish orange tone]) / irradiated with gamma[239] rays at 64.7 Mrad<br>(followed at «brown [pink and grey tones], between "medium brown [pink and grey tones]" and "dark brown [pink and grey tones]"») |
| medium pinkish orange-brown<br>↓ | 6627 | <u>production process:</u><br>(followed from «medium brown [orange-red tone]»)<br>0↑1400 °F / slow cooling in furnace (indian red[107]): .10 g + 1.50 g of feldspar<br><br>(followed at «dark brown [orange-red tone]»)<br><br>(followed from «dark reddish brown») |

| | | |
|---|---|---|
| medium pinkish orange-brown | 6628 | 0↑1400 °F / slow cooling in furnace (indian red[107]): 1 g + 1.50 g of feldspar (followed at «dark reddish brown») |
| pinkish orange-brown a bit darker and more red, intense and luminous than «medium pinkish orange-brown» | 6629 | production process: 0↑1400 °F / slow cooling in furnace (indian red[107]): 1 g + 1.50 g of feldspar (medium brown [pinkish orange tone]) / irradiated with gamma[239] rays at 64.7 Mrad<br><br>(followed at «dark brown [orange-red tone]») |
| pinkish orange-brown a bit darker than «medium pinkish orange-brown» | 6630 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>production process:<br>10 g of shale + 10 cc of white opaque printing ink / mechanical grinding [with a weak tension between the grinding rollers] / 5 superimpositions on a white glazed sheet of paper (medium and mat orange- or pink-brown) / irradiated with gamma rays at 22.8 Mrad[90,761] |
| brown (reddish orange tone) | | |
| reddish orange-brown a bit darker than «reddish orange-brown» | 6631 | mineral : ochre[128]<br>powder : black<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «dark orange-brown»)<br>1 g of ochre + 1 g of halite / 0↑1300 °F<br><br>(followed at «reddish brown») |
| | | mineral : nickeliferous pyrrhotite[23]<br>rock : dark iron-grey, with silver and golden yellow metallic brilliance<br>powder : dark iron-grey |

1242

| | | |
|---|---|---|
| reddish orange-brown darker than «reddish orange-brown» | 6632 | origin : Inco Co., Sudbury, Ontario<br><br><u>production process:</u><br>4 g of pyrrhotite + 20 ml hydrochloric acid / soaking: 3 d. / drying on hot plate (medium orange-brown) / irradiated with gamma rays at 64.7 Mrad (followed at «dark chocolate-brown [light rusty orange tone]») |
| brown (lightened reddish orange tone) a bit more pale than «medium reddish orange-brown» | 6633 | mineral : zinc concentrate grilled at 1000 °C $(ZnO-FeO)(SO_4)$<br>powder : reddish brown<br>origin : Zinc Electrolytic du Canada Co., Québec<br><br><u>production process:</u><br>(followed from «reddish orange-brown more accentuated and darker than "medium reddish orange-brown"») 4 g of concentrate + 50 ml nitric acid / soaking: 4 wk. / drying on hot plate (medium orange-brown) / irradiated with $gamma^{239}$ rays at 424.7 Mrad |
| medium reddish orange-brown | 6634 | mineral : solid epidote<br>rock : brownish green<br>powder : brownish green<br>origin : James Bay, Québec<br><br><u>production process:</u><br>1600 °F / 15 h |
| medium reddish orange-brown, with a copper metallic brilliance | 6635 | mineral : hornblende<br>rock : medium evergreen (light grey tone), with a vitreous brilliance<br>powder : medium cold grey (light green tone)<br>origin : Abitibi, Québec<br><br>mineral : sulphur<br>rock : brilliant yellow<br>powder : brilliant yellow<br>origin : unknown<br><br><u>production process:</u><br>2 g of hornblende + 2 g of sulphur / 1300 °F / 1 h (orange-yellow [tends towards brown], with a hot metallic brilliance) / irradiated with gamma rays at 64.7 Mrad (followed at «brown [dark orange-yellow tone], with light and cold metallic brilliance») |

1243

| | | |
|---|---|---|
| medium reddish orange-brown | 6636 | mineral : uraninite<br>rock : medium chocolate-brown (red Bordeau tone)<br>powder : medium milky chocolate-brown<br>origin : Yellowknife, Canada<br><br>mineral : sulphur<br>rock : brilliant yellow<br>powder : brilliant yellow<br>origin : unknown<br><br>production process:<br>2 g of uraninite + 2 g of sulphur / 1300 °F / 1 h |
| accentuated and dark medium reddish orange-brown | 6637 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «apple-green much more accentuated and luminous than "vivid apple-green"»)<br>5 g of iron sulphide - nickel + 25 ml hydrochloric acid / soaking: 3 d. / drying on hot plate (vivid apple-green) / irradiated with gamma[239] rays at 424.7 Mrad |
| medium reddish orange-brown more accentuated and a bit darker than «medium reddish orange-brown» | 6638 | mineral : zinc concentrate grilled at 1000 °C ($ZnO-FeO)(SO_4$)<br>powder : reddish brown<br>origin : Zinc Electrolytic du Canada Co., Québec<br><br>production process:<br>4 g of concentrate + 50 ml nitric acid / soaking: 4 wk. / drying on hot plate (medium orange-brown) / irradiated with gamma[239] rays at 64.7 Mrad<br><br>(followed at «reddish orange-brown a bit more pale than "medium reddish orange-brown"») |
| | | mineral : clay<br>block : pale greyish green<br>powder : pale greyish green<br>origin : bank of St.-Lawrence river at the rear of the Miguasha Museum, Gaspésie, Québec |

1244

| | | |
|---|---|---|
| reddish orange-brown a bit darker than «medium reddish orange-brown» | 6639 | production process:<br>(followed from «brown [orange-red tone] a bit more pale than "medium brown [orange-red tone]"»)<br>0↑1900 °F (medium brown [orange-red tone]) / irradiated with gamma[45,571] rays at 424.7 Mrad |
| reddish orange-brown a bit darker than «medium reddish orange-brown» | 6640 | mineral : ochre[128]<br>powder : black<br>origin : Red Mill, in the suburbs of Cap-de-la-Madeleine, Québec<br><br>production process:<br>(followed from «medium orange-brown»)<br>0↑1300 °F<br><br>(followed at «brown [orange-red tone]») |
| reddish orange-brown darker than «medium reddish orange-brown» | 6641 | mineral : ochre[128]<br>powder : black<br>origin : Red Mill, in the suburbs of Cap-de-la-Madeleine, Québec<br><br>mineral : table salt (NaCl)<br>powder : colourless<br>origin : Sifto Company<br><br>production process:<br>(followed from «medium orange-brown»)<br>10 g of ochre + 10 g of NaCl / 0↑1300 °F[762]<br><br>(followed at «dark reddish brown») |
| reddish orange-brown darker than «medium reddish orange-brown» | 6642 | mineral : sandstone<br>rock : medium pinkish brown (light violet tone)<br>powder : medium pinkish brown (light violet tone)<br>origin : at the rear of Percé, Gaspésie, Québec<br><br>production process:<br>0↑2000 °F (medium rusty brown) / irradiated with electrons at 302,831 rad[36] |
| | | mineral : peridotite |

| | | |
|---|---|---|
| reddish orange-brown much more pale than «fairly vivid reddish orange-brown» | 6643 | rock : medium grey<br>powder : medium brownish grey (green reflection)<br>origin : Thetford Mines, Québec<br><br>production process:<br>0↑2000 °F (fairly vivid brown [reddish orange tone]) / irradiated with gamma rays at 64.7 Mrad<br><br>(followed at «medium orange-brown») |
| fairly vivid reddish orange-brown | 6644 | production process:<br>0↑2000 °F |
| reddish orange-brown more orange and a bit lighter than «dark reddish orange-brown» | 6645 | mineral : chalcopyrite<br>powder : dark grey (light green tone)<br>origin : Centre de recherche des Mines Noranda in Montréal, Québec<br><br>production process:<br>4 g of chalcopyrite + 50 ml hydrochloric acid / soaking: 4 wk. / drying on hot plate (dark brown [reddish orange tone]) / irradiated with gamma rays at 64.7 Mrad<br>(followed at «very dark brown [orange-red tone]») |
| reddish orange-brown [between «medium and dark reddish orange-brown»] | 6646 | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>(followed from «orange-brown»)<br>2 g of ilmenite + 2 g of sodium carbonate:<br>0↑1500 °F + 15 min. at 1500 °F |
| more accentuated reddish orange-brown [between «medium and dark reddish orange-brown»] | 6647 | 0↑1500 °F + 45 min. at 1500 °F |

| | | |
|---|---|---|
| reddish orange-brown still more accentuated [between «medium and dark reddish orange-brown»] | 6648 | 0↑1500 °F + 1 h at 1500 °F |
| ↓ | | |
| brown (accentuated reddish orange tone) [between «medium and dark reddish orange-brown»] (identical to the previous colour) | 6649 | 0↑1600 °F + 1 h at 1600 °F |
| ↓ | | |
| brown (reddish orange tone a bit more accentuated) [between «medium and dark reddish orange-brown»] | 6650 | 0↑1700 °F + 1 h at 1700 °F |
| ↓ | | |
| brown (accentuated reddish orange tone) [between «medium and dark reddish orange-brown»] (identical to the previous colour) | 6651 | 0↑1800 °F + 1 h at 1800 °F |
| ↓ | | |
| brown (accentuated reddish orange tone) [between «medium and dark reddish orange-brown»] (identical to the previous colour) | 6652 | 0↑1900 °F + 1 h at 1900 °F |
| | | mineral : siderite |

| | | |
|---|---|---|
| dark reddish orange-brown | 6652.1 | rock : caramel-brown (grey tone)<br>powder : light beige (orange tone)<br>origin : De-Mix quarry, North side of Mont Saint-Hilaire, Rouville county, Québec<br><br>production process:<br>1 g of siderite + 5 g of pyrex / manual grinding / heating: 5 °C per min. 0↑1245 °C + maintenance during 1 h / cooling: 5 °C per min. until ambient temperature is reached / the entity is done in ambient air (dark brownish grey) / irradiated with gamma rays at 9.88 Mrad |
| dark reddish orange-brown | 6653 | mineral : chalcopyrite<br>powder : dark grey (light green tone)<br>origin : Centre de recherche des Mines Noranda in Montréal, Québec<br><br>production process:<br>4 g of chalcopyrite + 50 ml hydrochloric acid / soaking: 4 wk. / drying on hot plate |
| dark reddish orange-brown | 6654 | mineral : uraninite<br>rock : medium chocolate-brown (red Bordeau tone)<br>powder : medium milky chocolate-brown<br>origin : Yellowknife, Canada<br><br>production process:<br>0↑1900 °F (medium orange-brown): 1 g + 80 ml hydrochloric acid / soaking: 2 wk. / drying on hot plate (sunny yellow) / irradiated with gamma rays[239,538] at 430.4 Mrad |
| reddish orange-brown a bit darker and more luminous than «dark reddish orange-brown» | 6655 | mineral : almandite<br>rock : dark brownish red<br>powder : medium brownish red<br>origin : Gore Mountain, Warren county, New York state, United States<br><br>production process:<br>(followed from «rusty orange-brown»)<br>0↑1900 °F (dark iron-grey): .50 g + 50 ml hydrochloric acid / soaking: 2 wk. / drying on hot plate (dark rusty orange-brown) / irradiated with gamma[239] rays at 430.4 Mrad |
| | | mineral : ochre[128]<br>powder : black |

| | | |
|---|---|---|
| reddish orange-brown a bit darker than «dark reddish orange-brown» | 6656 | origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «dark orange-brown»)<br>1 g of ochre + 3 g of halite / 0↑1300 °F<br><br>(followed at «brown [violet-red tone]») |
| dark brown (strongly accentuated reddish orange tone), more pale than «dark brown [almost black] (reddish orange tone)» | 6657 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>(followed from «brown a bit darker than "very dark brown, almost black"»)<br>0↑1900 °F (dark iron-grey): 1 g + 50 ml hydrochloric acid / soaking: 2 wk. / drying on hot plate (very dark brown, almost black) / irradiated with gamma rays at 430.4 Mrad |
| orange-brown (caramel tone) | | |
| orange-brown (caramel tone) a bit more pale than orange-brown (caramel tone)» | 6658 | mineral : steatite<br>rock : light cold grey, slightly translucid<br>powder : light grey<br>origin : East Broughton, Québec<br><br>production process:<br>(followed from «orange-brown a bit darker than "light orange-brown"»)<br>0↑2200 °F (light orange-brown) / powder irradiated with electrons at 302,831 rad[45] |
| orange-brown (grey tone) | | |

| | | |
|---|---|---|
| orange-brown (grey tone and apple-green reflection) [between «light and medium orange-brown (grey tone and apple-green reflection)»] | 6659 | mineral : beryl<br>rock : intense grass-green, slightly translucid<br>powder : greenish grey<br>origin : unknown<br><br>production process:<br>(followed from «apple-green»)<br>3 g of beryl + 40 ml nitric acid / soaking: 1 wk. / separation of the liquid and the solid / natural drying (colour of the solid: very light[24] apple-green) / irradiated with gamma rays at 425.65 Mrad |
| mixture of particles | | |
| pale orange-brown (grey tone) / beige [between «light and medium beige»] | 6660 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «greyish beige»)<br>3 g of asbestos + 20 ml hydrofluoric acid / soaking: 24 h / drying in oven at 100 °F (light grey [beige tone]) / irradiated with gamma rays at 550.22 Mrad |
| rusty brown | | |
| rusty brown a bit more pale than «rusty brown» | 6661 | mineral : tiger-eye agate<br>rock : orange with silky luster, opaque<br>powder : orange with silky luster<br>origin : Africa<br><br>production process:<br>3 g of agate + 40 ml nitric acid / soaking: 1 wk. / separation of the liquid and the solid / natural drying (colour of the solid: rusty brown) / irradiated with gamma rays at 64.7 Mrad<br>(followed at «rusty brown darker than "rusty brown"») |
| | | mineral : sodalite<br>rock : light cold blue |

1250

| | | |
|---|---|---|
| rusty brown lighter than «rusty brown» | 6662 | powder : light grey (light blue tone)<br>origin : Bancroft, Ontario<br><br>production process:<br>2 g of sodalite + 2 g of sodium carbonate / 0↑1800 °F + 1 h at 1800 °F (greenish blue) / irradiated with electrons at 162,431 rad |
| rusty brown | 6663 | mineral : actinolite<br>rock : cold and light evergreen<br>powder : light grey (light green tone)<br>origin : erratic block found at Saint-Philémon near Dorchester, Québec<br><br>production process:<br>3 g of actinolite + 50 ml nitric acid / soaking: 2 wk. / separation of the liquid and the solid / drying on hot plate (colour of the liquid: medium rusty orange [brown tone]) / irradiated with gamma rays at 70.4 Mrad[763]<br>(followed at «dark greyish chocolate-brown [very light orange reflection]») |
| rusty brown | 6664 | mineral : tiger-eye agate<br>rock : orange with silky luster, opaque<br>powder : orange with silky luster<br>origin : Africa<br><br>production process:<br>3 g of agate + 40 ml nitric acid / soaking: 1 wk. / separation of the liquid and the solid / natural drying / colour of the solid<br>(followed at «rusty brown darker than "rusty brown"») |
| rusty brown<br>↓<br>rusty brown | 6665<br><br>6666 | mineral : bloody agate<br>rock : dark grass-green, slightly translucid<br>powder : light grey (light green tone)<br>rock : India<br><br>production process:<br>8 g of agate + 40 ml hydrochloric acid / soaking: 1 wk. / separation of the liquid and the solid / natural drying (colour of the liquid: medium olive-green) / irradiated with electrons at:<br>164,800 rad<br><br>305,200 rad[73] |
| | | mineral : bauxite[92]<br>powder : pinkish beige, mat |

| | | |
|---|---|---|
| rusty brown | 6667 | origin : Alcan Company, French Guyana<br><br>production process:<br>40 g of bauxite + 100 ml hydrochloric acid / soaking: 5 months / natural drying (very intense olive-green) / irradiated with electrons at 162,431 rad |
| rusty brown | 6668 | mineral : bornite<br>rock : reddish brown (with localized green and bluish green oxidation)<br>powder : reddish brown<br>origin : Lac Musset, Fosse du Labrador, Québec<br><br>production process:<br>2 g of bornite + 25 ml hydrochloric acid / soaking: 6 d. / separation of the liquid and the solid / natural drying (colour of the liquid: light greenish turquoise) / irradiated with electrons at 164,300 rad |
| rusty brown | 6669 | mineral : cerite<br>rock : dark brownish grey<br>powder : light grey (light brown tone)<br>origin : Jamestown, Boulder county, Colorado, United States<br><br>production process:<br>4 g of cerite + 100 ml hydrochloric acid / soaking: 2 wk. / drying on hot plate (medium reddish orange) / irradiated with gamma$^{239}$ rays at 64.7 Mrad<br>(followed at «rusty brown [between "medium rusty brown" and "dark rusty brown"]») |
| rusty brown | 6670 | mineral : zinc concentrate grilled at 1000 °C ($ZnO-FeO)(SO_4$)<br>powder : reddish brown<br>origin : Zinc Electrolytic du Canada Co., Québec<br><br>production process:<br>(followed at «chocolate-brown»)<br>2 g of concentrate + 2 g of sodium carbonate / 0↑1500 °F + 1 h at 1500 °F<br>(followed at «dark rusty brown») |
| | | mineral : corundum<br>rock : medium grey<br>powder : light grey<br>origin : Transvaal, Africa |

1252

| | | |
|---|---|---|
| rusty brown | 6671 | <u>production process:</u><br>2 g of corundum + 20 ml hydrofluoric acid / soa-king: 24 h / drying in oven at 100 °F (mixture of particles: beige / orange-brown) / irradiated with electrons at 162,431 rad |
| rusty brown | 6672 | mineral : corundum<br>rock : rusty yellow<br>powder : light grey<br>origin : Mount Eagle, Ontario<br><br><u>production process:</u><br>2 g of corundum + 25 ml sulphuric acid / soaking: 24 h / drying on hot plate (medium beige [light grey tone]) / irradiated with electrons at 162,431 rad |
| rusty brown | 6673 | mineral : solid epidote<br>rock : brownish green<br>powder : brownish green<br>origin : James Bay, Québec<br><br><u>production process:</u><br>12 g of epidote + 40 ml hydrochloric acid / soa-king: 14 d. / separation of the liquid and the so-lid / natural drying (colour of the solid: vivid yellow) / irradiated with gamma rays at 65.65 Mrad (followed at «dark greyish brown») |
| rusty brown | 6674 | <u>production process:</u><br>0↑1700 °F (dark reddish brown) : 1 g + 40 ml ni-tric acid / natural drying |
| rusty brown | 6675 | mineral : biotite gneiss<br>rock : blackish grey, golden vitreous brilliance<br>powder : dark grey<br>origin : Grenville geological province, Québec<br><br><u>production process:</u><br>12 g of gneiss + 40 ml nitric acid / soaking: 22 d. / drying on hot plate (dark and vivid reddish orange) / irradiated with gamma rays at 63.88 Mrad (followed at «rusty orange») |
| | | mineral : goethite[106]<br>powder : rusty orange<br>origin : Red Mill, in the suburbs of Cap-de-la-Madeleine, Québec<br><br>mineral : feldspar<br>rock : white, opaque |

| | | |
|---|---|---|
| | | powder : white<br>origin : Baraute, Abitibi, Québec<br><br>mineral : zirconium silicate<br>powder : white (very light yellow reflection)<br>origin : Sial Company, Québec<br><br><u>production process:</u> |
| rusty brown | 6676 | 0↑1400 °F / slow cooling in furnace (indian red[107]): 1 g + 1 g of feldspar (dark reddish brown [tends towards Burgundy red]): .50 g + .50 g of sodium carbonate + .50 g of zirconium silicate / 1700 °F / 1 h (light green) / irradiated with gamma rays at 65.65 Mrad<br>(followed at «reddish brown») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>(followed from «brown [light orange tone]» and «brown [very light orange tone]») |
| rusty brown<br>↓ | 6677 | 2 g of goethite + 2 g of sulphur / 700 °F / 1 h<br><br>(followed at «dark chocolate-brown»)<br><br>(followed from «chocolate-brown lighter than "chocolate-brown"») |
| rusty brown<br>↓ | 6678 | 2 g of goethite + 2 g of sulphur / 800 °F / 1 h<br><br>(followed at «medium chocolate-brown»)<br><br>(followed from «dark chocolate-brown») |
| rusty brown a bit more brown | 6679 | 2 g of goethite + 6 g of sulphur / 800 °F / 1 h<br>(followed at «light chocolate-brown» and «chocolate-brown lighter than "medium chocolate-brown"») |
| | | mineral : goethite[106]<br>powder : rusty orange<br>origin : Red Mill, in the suburbs of Cap-de-la-Madeleine, Québec |

| | | |
|---|---|---|
| rusty brown | 6680 | mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>(followed from «dark orange-beige»)<br>1 g of goethite + 1 g of titanium dioxide + 1 g of sodium carbonate + 1 g of zirconium silicate / 1700 °F / 1 h<br>(followed at «dark greyish brown») |
| rusty brown | 6681 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «rusty orange which becomes more brown and darkens»)<br>1 g of goethite + 1 g of zirconium silicate (whitened rusty orange) / irradiated with gamma rays at 287.3 Mrad<br>(followed at «dark chocolate-brown») |
| rusty brown | 6682 | mineral : haematite<br>rock : medium chocolate-brown<br>powder : medium chocolate-brown<br>origin : Nouveau Québec, Québec<br><br>production process:<br>4 g of haematite + 80 ml hydrochloric acid / soaking: 2 wk. / drying on hot plate (dark chocolate-brown [pronounced orange tone]) / irradiated with electrons at 162,431 rad |
| rusty brown | 6683 | production process:<br>0↑1800 °F (dark violet-brown): 4 g + 80 ml hydrochloric acid / soaking: 2 wk. / drying on hot plate (dark brown [light rusty tone]) / irradiated with electrons at 162,431 rad |
| | | mineral : ochre[98]<br>powder : yellow<br>origin : small copper and nickel deposit, in the South-Western area of a mass of |

1255

| | | |
|---|---|---|
| | | serpentinite at 3 km at the West of Saint-Fabien-de-Panet, Québec |
| rusty brown | 6684 | production process: 10 g of ochre + 100 ml sulphuric acid / soaking: 1 wk. / drying on hot plate (light brownish grey) / irradiated with electrons at 162,431 rad |
| | | mineral : uraninite<br>rock : medium chocolate-brown (red Bordeau tone)<br>powder : medium milky chocolate-brown<br>origin : Yellowknife, Canada |
| rusty brown | 6685 | production process: 8 g of uraninite + 100 ml hydrochloric acid / soaking: 2 wk. / drying on hot plate (sunny yellow) / irradiated with gamma rays at 63.89 Mrad (followed at «rusty brown [red tone]») |
| | | mineral : pyrochlore<br>powder : reddish brown<br>origin : De-Mix quarry, North side of Mont Saint-Hilaire, Rouville county, Québec |
| rusty brown | 6686 | production process: .40 g of pyrochlore + 50 ml hydrochloric acid / soaking: 2 wk. / drying on hot plate |
| | | mineral : nickeliferous pyrrhotite[23]<br>rock : dark iron-grey, with silver and golden yellow metallic brilliance<br>powder : dark iron-grey<br>origin : Inco Co., Sudbury, Ontario |
| rusty brown | 6687 | production process: 4 g of pyrrhotite + 50 ml hydrochloric acid / soaking: 2 wk. / drying on hot plate (medium rusty orange [brown tone]) / irradiated with gamma rays at 70.4 Mrad (followed at «dark chocolate-brown») |
| | | mineral : serpentine<br>rock : yellowish green<br>powder : light greenish yellow<br>origin : probably Thetford Mines, Eastern Townships, Québec |

1256

| | | |
|---|---|---|
| rusty brown | 6688 | production process:<br>(followed from «dark khaki-green [light brown tone]»)<br>1 g of serpentine + 1 cc of white transparent synthetic enamel paint used for the car / manual grinding / application on a piece of steel sheet used for the car's body measuring 1" x 1" (pastel greyish green, almost white) / irradiated with gamma rays at 360 Mrad |
| brown (light rusty tone) | 6689 | mineral : sphalerite[27]<br>rock : dark grey, with golden yellow metallic brilliance<br>powder : dark brownish grey<br>origin : Matagami Mine, Matagami, Québec<br><br>production process:<br>0↑1800 °F (medium chocolate-brown): 4 g + 80 ml hydrochloric acid / soaking: 2 wk. / drying on hot plate |
| rusty brown | 6690 | production process:<br>0↑1800 °F (medium chocolate-brown): 1 g + 50 ml hydrochloric acid / soaking: 2 wk. / drying on hot plate (medium rusty orange) / irradiated with gamma rays at 64.7 Mrad<br>(followed at «rusty brown [between "medium rusty brown" and "dark rusty brown"]») |
| rusty brown | 6691 | mineral : tremolite<br>rock : medium brown (evergreen tone)<br>powder : greyish beige<br>origin : Tetreault Mine, Montauban, Portneuf county, Québec<br><br>production process:<br>0↑1900 °F (orange-beige): .30 g + 50 ml hydrochloric acid / soaking: 2 wk. / drying on hot plate (orange-beige) / irradiated with gamma rays at 64.7 Mrad[239]<br>(followed at «dark chocolate-brown») |
| rusty brown a bit darker than «rusty brown» | 6692 | mineral : tiger-eye agate<br>rock : orange with silky luster, opaque<br>powder : orange with silky luster<br>origin : Africa<br>production process:<br>(followed from «rusty brown more pale than "rusty brown"»)<br>3 g of agate + 40 ml nitric acid / soaking: 1 wk. / separation of the liquid and the solid / natural drying (colour of the solid: rusty brown) / irradiated with gamma[228] rays at 424.7 Mrad |

1257

| | | |
|---|---|---|
| rusty brown a bit darker [brown] than «rusty brown» | 6693 | mineral : solid epidote<br>rock : brownish green<br>powder : brownish green<br>origin : James Bay, Québec<br><br>production process:<br>0↑1700 °F (dark reddish brown): 1 g + 40 ml nitric acid / natural drying (rusty brown) / irradiated with gamma[228] rays at 65.65 Mrad (followed at «rusty brown [between "medium rusty brown" and "dark rusty brown"]») |
| rusty brown darker [brown] than «rusty brown» | 6694 | mineral : olivine<br>rock : light grey, crystalline<br>powder : very light grey<br>origin : Mont Albert, Gaspésie, Québec<br><br>production process:<br>(followed from «rusty brown [red tone]»)<br>2 g of olivine + 2 g of sodium carbonate / 0↑1600 °F + 20 min. at 1600 °F (greenish brown [tends towards olive-green]) / irradiated with gamma rays at 424.7 Mrad |
| rusty brown a bit less intense, less dark than «medium rusty brown» | 6695 | mineral : uraninite<br>rock : medium chocolate-brown (red Bordeau tone)<br>powder : medium milky chocolate-brown<br>origin : Yellowknife, Canada<br><br>production process:<br>2 g of uraninite + 2 g of sodium carbonate / 0↑1300 °F + 1 h at 1300 °F (medium brown [light rusty tone]) / irradiated with gamma rays at 64.7 Mrad<br>(followed at «medium chocolate-brown») |
| medium rusty brown | 6696 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>50 g of asbestos + 200 ml hydrochloric acid <u>or</u> asbestos entirely covered with hydrochloric acid / soaking: 1 wk. / drying on hot plate (vivid yellow): 1 g + 1 g of sodium carbonate + 2 g of |

1258

| | | |
|---|---|---|
| | | sulphur / 1700 °F / 1 h<br>(followed at «black» and «dark rusty brown») |
| medium rusty brown | 6697 | mineral : bauxite[92]<br>powder : pinkish beige, mat<br>origin : Alcan Company, French Guyana<br><br>production process:<br>55 g of bauxite entirely covered with a solution composed of one part of water and one part of hydrochloric acid (the bauxite is entirely covered) / soaking: 24 h / drying in oven at 130 °C |
| medium rusty brown | 6698 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «light beige»)<br>1 g of fluorine + 1 cc of white transparent synthetic enamel paint used for the car / manual grinding / application on a piece of steel sheet used for the car's body measuring 1" x 1" (light grey) / irradiated with gamma[351,352] rays at 102.4 Mrad<br>(followed at «rusty brown more intense than "medium rusty brown"») |
| medium rusty brown | 6699 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>1 g of goethite + 1 g of sodium carbonate + 1 g of sulphur + 1 g of titanium dioxide / 1600 °F / 1 h<br>(followed at «dark chocolate-brown [orange tone]» and «blackish chocolate-brown») |
| | | mineral : sandstone<br>rock : medium pinkish brown (light violet tone) |

| | | |
|---|---|---|
| | | powder : medium pinkish brown (light violet tone)<br>origin : at the rear of Percé, Gaspésie, Québec<br><br>production process: |
| medium rusty brown<br>↓<br>medium rusty brown | 6700<br><br>6701 | 0↑1900 °F<br><br>0↑2000 °F |
| medium brown (light rusty tone) | 6702 | mineral : uraninite<br>rock : medium chocolate-brown (red Bordeau tone)<br>powder : medium milky chocolate-brown<br>origin : Yellowknife, Canada<br><br>production process:<br>(followed from «brown»)<br>2 g of uraninite + 2 g of sodium carbonate / 0↑1300 °F + 1 h at 1300 °F<br>(followed at «brown darker than "brown"») |
| medium rusty brown | 6703 | mineral : rutile<br>powder : dark brown (orange-red reflection)<br>origin : North Stradbroke Island, Queensland, Australia<br><br>production process:<br>.40 g of rutile + 50 ml sulphuric acid / soaking: 2 wk. / drying on hot plate (mixture of particles: white / brown) / irradiated with electrons at 164,800 rad |
| rusty brown more intense than «medium rusty brown» | 6704 | mineral : fluorine<br>rock : violet and white, translucid<br>powder : very light grey<br>origin : Saint-Lawrence Fluorspar Company, Saint-Lawrence, Newfoundland<br>production process:<br>(followed from «medium rusty brown»)<br>1 g of fluorine + 1 cc of white transparent synthetic enamel paint used for the car / manual grinding / application on a piece of steel sheet used for the car's body measuring 1" x 1" (light grey) / irradiated with gamma[351,352] rays at 360 Mrad |
| | | mineral : sandstone<br>rock : medium pinkish brown (light violet tone)<br>poudre : medium pinkish brown (light violet |

| | | |
|---|---|---|
| | | tone)<br>origin : at the rear of Percé, Gaspésie, Québec<br><br>production process: |
| rusty brown very slightly darker than «medium rusty brown» | 6705 | 0↑2000 °F (medium rusty brown) / powder irradiated with gamma rays at 64.7 Mrad<br>(followed at «rusty brown [red tone]») |
| | | mineral : biotite gneiss<br>rock : blackish grey, golden vitreous brilliance<br>powder : dark grey<br>origin : Grenville geological province, Québec<br><br>production process:<br>(followed from «rusty orange lighter than "medium rusty orange"») |
| rusty brown darker than «medium rusty brown» | 6706 | 1600 °F / 15 h (medium orange-pink, mat): .50 g + 40 ml hydrochloric acid / natural drying (medium rusty orange) / irradiated with gamma rays at 425.65 Mrad |
| | | mineral : sandstone<br>rock : medium pinkish brown (light violet tone)<br>poudre : medium pinkish brown (light violet tone)<br>origin : at the rear of Percé, Gaspésie, Québec<br>production process: |
| rusty brown darker and more intense than «medium rusty brown» | 6707 | 0↑1900 °F (medium rusty brown): 2 g + 80 ml hydrochloric acid / soaking: 2 wk. / drying on hot plate (medium rusty orange [red tone]) / irradiated with gamma$^{239}$ rays at 64.7 Mrad<br>(folowed at «reddish rusty brown») |
| | | mineral : hypersthene<br>rock : black<br>powder : medium brownish grey<br>origin : Lac Saint-Jean, Québec<br>production process: |
| accentuated rusty brown | 6708 | 2 g of hypersthene + 2 g of sodium carbonate / 0↑1500 °F + 1 h at 1500 °F (orange [light brown tone]) / irradiated with electrons at 162,431 rad |
| | | mineral : cerite<br>rock : dark brownish grey<br>powder : light grey (light brown tone)<br>origin : Jamestown, Boulder county, Colorado, |

| | | |
|---|---|---|
| | | United States |
| rusty brown [between «medium and dark rusty brown»] | 6709 | production process: (followed from «rusty brown») 4 g of cerite + 100 ml hydrochloric acid / soaking: 2 wk. / drying on hot plate (medium reddish orange) / irradiated with gamma[239] rays at 424.7 Mrad |
| rusty brown [between «medium and dark rusty brown»] | 6710 | mineral : solid epidote<br>rock : brownish green<br>powder : brownish green<br>origin : James Bay, Québec<br><br>production process: (followed from «rusty brown a bit darker than "rusty brown"») 0↑1700 °F (dark reddish brown): 1 g + 40 ml nitric acid / natural drying (rusty brown) / irradiated with gamma[228] rays at 425.65 Mrad |
| brown (light rusty reflection) [between «medium and dark rusty brown»] | 6711 | mineral : goethite[106]<br>powder : rusty orange<br>origin : Red Mill, in the suburbs of Cap-de-la-Madeleine, Québec<br>production process: 5 g of goethite + 100 sulphuric acid / soaking: 24 h / drying on hot plate (greenish brown) / irradiated with electrons at 162,431 rad |
| rusty brown [between «medium and dark rusty brown»] | 6712 | mineral : sphalerite[27]<br>rock : dark grey, with golden yellow metallic brilliance<br>powder : dark brownish grey<br>origin : Matagami Mine, Matagami, Québec<br>production process: (followed from «rusty brown») 0↑1800 °F (medium chocolate-brown): 1 g + 50 ml hydrochloric acid / soaking: 2 wk. / drying on hot plate (medium rusty orange) / irradiated with gamma rays at 424.7 Mrad |
| | | mineral : asbestos[4]<br>rock : dark grey (green reflection)<br>powder : light grey (green reflection)<br>origin : Asbestos Corporation Ltd., Thetford Mines, Québec |

1262

| | | |
|---|---|---|
| dark rusty brown | 6713 | mineral : sulphur<br>rock : brilliant yellow<br>powder : brilliant yellow<br>origin : unknown<br><br>production process:<br>(followed from «medium rusty brown»)<br>50 g of asbestos + 200 ml hydrochloric acid or asbestos entirely covered with hydrochloric acid / soaking: 1 wk. / drying on hot plate (vivid yellow): 1 g + 1 g of sodium carbonate + 1 g of sulphur / 1700 °F / 1 h<br>(followed at «black») |
| | | mineral : zinc concentrate grilled at 1000 °C ($ZnO$-$FeO$)($SO_4$)<br>powder : reddish brown<br>origin : Zinc Electrolytic du Canada Co., Québec<br><br>production process:<br>(followed at «rusty brown»)<br>2 g of concentrate + 2 g of sodium carbonate: |
| dark rusty brown | 6714 | 0↑1600 °F + 1 h at 1600 °F |
| dark rusty brown | 6715 | 0↑1700 °F + 1 h at 1700 °F |
| dark rusty brown | 6716 | 0↑1800 °F + 1 h at 1800 °F |
| dark rusty brown | 6717 | 0↑1900 °F + 1 h at 1900 °F |
| dark brown (light rusty tone) | 6718 | mineral : haematite<br>rock : medium chocolate-brown<br>powder : medium chocolate-brown<br>origin : Nouveau Québec, Québec<br><br>production process:<br>0↑1800 °F (dark violet-brown): 4 g + 80 ml hydrochloric acid / soaking: 2 wk. / drying on hot plate |
| dark brown (rusty tone) | 6718.1 | mineral : goethite[106]<br>powder : rusty orange<br>origin : Red Mill, in the suburbs of Cap-de-la-Madeleine, Québec<br><br>production process:<br>1 g of goethite + 5 g of pyrex / manual grinding / heating: 5 °C per min. 0↑1245 °C + maintenance during 1 h / cooling: 5 °C per min. until ambient temperature is reached / the entity is done in ambient air (dark metallic grey) / irradiated with gamma rays at 9.88 Mrad |

| | | |
|---|---|---|
| | | mineral : zincite<br>rock : mixture of areas: dark grey / red (orange tone)<br>powder : medium milky chocolate-brown (red tone)<br>origin : Franklin, New Jersey, United States<br><br>production process:<br>0↑1900 °F (black): .40 g + 50 ml hydrochloric acid / soaking: 2 wk. / drying on hot plate (medium rusty orange) / irradiated with gamma[239] rays at: |
| dark rusty brown<br>↓ | 6719 | 64.7 Mrad |
| darker [more brown] rusty brown | 6720 | 424.7 Mrad |
| mixture of particles | | |
| | | mineral : pyrophillite<br>rock : light beige (grey and pink tones), opaque<br>powder : very light beige (grey and orange-pink tones)<br>origin : Carpentier district, Abitibi, Québec<br><br>production process: |
| rusty brown / creamy beige | 6721 | 0↑1900 °F (light beige): .20 g + 50 ml nitric acid / soaking: 2 wk. / drying on hot plate |
| rusty brown (green tone) | | |
| | | mineral : hypersthene<br>rock : black<br>powder : medium brownish grey<br>origin : Lac Saint-Jean, Québec<br><br>production process: |
| pale rusty brown (light green tone) | 6722 | 2 g of hypersthene + 2 g of sodium carbonate / 0↑1900 °F + 1 h at 1900 °F (grass-green [light brown tone]) / irradiated with electrons at 162,431 rad |
| mixture of particles | | |
| | | mineral : crocidolite<br>rock : dark greyish blue<br>powder : pale greyish blue<br>origin : Griqualand district, South Africa<br><br>production process: |
| rusty brown (light | 6723 | 4 g of crocidolite + 50 ml nitric acid / soaking: |

1264

| | | |
|---|---|---|
| green reflection) / blue (light green reflection) | | 4 wk. / drying on hot plate |
| rusty brown (greenish yellow tone) | | |
| rusty brown (localized greenish yellow tone), a bit darker [brown] than «medium rusty brown (greenish yellow tone)» | 6724 | mineral : anorthosite<br>rock : dark grey<br>powder : medium grey<br>origin : Jonquière, Lac Saint-Jean, Québec<br><br>production process:<br>6 g of anorthosite + 50 ml nitric acid / soaking: 2 wk. / drying on hot plate (medium khaki-brown [yellow tone]) / irradiated with gamma rays at 424.7 Mrad[81] |
| rusty brown (orange tone) | | |
| rusty brown (orange tone) | 6725 | mineral : pyrochlore<br>powder : reddish brown<br>origin : De-Mix quarry, North side of Mont Saint-Hilaire, Rouville county, Québec<br><br>production process:<br>.40 g of pyrochlore + 50 ml hydrochloric acid / soaking: 2 wk. / drying on hot plate (rusty brown) / irradiated with gamma rays at 64.7 Mrad (followed at «very dark chocolate-brown, almost black») |
| rusty brown (orange tone; a bit more accentuated than «medium rusty brown (orange tone)» | 6726 | mineral : solid epidote<br>rock : brownish green<br>powder : brownish green<br>origin : James Bay, Québec<br><br>production process:<br>12 g of epidote + 40 ml nitric acid / soaking: 14 d. / drying on hot plate (medium rusty brown [orange tone]) / irradiated with electrons at 305,200 rad[67,73] |
| medium rusty brown (orange tone) | 6727 | production process:<br>12 g of epidote + 40 ml nitric acid / soaking: 14 d. / drying on hot plate |
| medium rusty brown | 6728 | production process:<br>0↑1200 °F (medium beige [light orange tone]): 1 g |

1265

| | | |
|---|---|---|
| (orange tone) | | + 40 nitric acid / natural drying |
| medium rusty brown (orange tone)<br>↓<br>dark rusty brown (accentuated orange tone) | 6729<br><br>6730 | mineral : goethite[106]<br>powder : rusty orange<br>origin : Red Mill, in the suburbs of Cap-de-la-Madeleine, Québec<br><br>production process:<br>5 g of goethite + 100 ml sulphuric acid / soaking: 24 h / drying on hot plate (greenish brown) / irradiated with gamma rays at:<br>64.7 Mrad<br><br>424.7 Mrad |
| dark rusty brown (orange tone) | 6731 | mineral : almandite<br>rock : dark brownish red<br>powder : medium brownish red<br>origin : Gore Mountain, Warren county, New York state, United States<br><br>production process:<br>0↑1900 °F (dark iron-grey): .50 g + 50 ml hydrochloric acid / soaking: 2 wk. / drying on hot plate |
| rusty brown (orange tone), a bit darker than «dark rusty brown (orange tone)» | 6732 | production process:<br>0↑1900 °F (dark iron-grey): .50 g + 50 ml hydrochloric acid / soaking: 2 wk. / drying on hot plate (dark rusty brown [orange tone]) / irradiated with gamma rays at 70.4 Mrad<br>(followed at «brown [reddish orange tone]») |
| rusty brown (red tone) | | |
| rusty brown (red tone), more red and more luminous than «rusty brown (red tone)» | 6733 | mineral : uraninite<br>rock : medium chocolate-brown (red Bordeau tone)<br>powder : medium milky chocolate-brown<br>origin : Yellowknife, Canada<br><br>production process:<br>(followed from «rusty brown»)<br>8 g of uraninite + 100 ml hydrochloric acid / soaking: 2 wk. / drying on hot plate (sunny yellow) / irradiated with gamma rays at 423.88 Mrad |

| | | |
|---|---|---|
| rusty brown (red tone) more red and a bit darker than «rusty brown (red tone)» | 6734 | mineral : olivine<br>rock : light grey, crystalline<br>powder : very light grey<br>origin : Mont Albert, Gaspésie, Québec<br><br>production process:<br>2 g of olivine + 2 g of sodium carbonate / 0↑1600 °F + 20 min. at 1600 °F (greenish brown [tends towards olive-green]) / irradiated with gamma rays at 64.7 Mrad<br>(followed at «rusty brown darker than "rusty brown"») |
| rusty brown (red tone) more vivid and dark than «rusty brown (red tone), darker than "medium rusty brown (red tone)"» | 6735 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «rusty brown very slightly darker than "medium rusty brown"»)<br>0↑2000 °F (medium rusty brown) / powder irradiated with gamma rays at 424.7 Mrad |
| rusty brown (red tone) much darker, intense and luminous than «medium rusty brown (red tone)» | 6736 | production process:<br>(followed from «rusty brown darker than "medium rusty brown"»)<br>0↑1900 °F (medium rusty brown): 2 g + 80 ml hydrochloric acid / soaking: 2 wk. / drying on hot plate (medium rusty orange [red tone]) / irradiated with gamma[239] rays at 424.7 Mrad |
| russet-brown | | |
| russet-brown | 6737 | mineral : olivine<br>rock : light grey, crystalline<br>powder : very light grey<br>origin : Mont Albert, Gaspésie, Québec<br>production process:<br>(followed from «medium orange-beige»)<br>2 g of olivine + 2 g of sodium carbonate: 0↑1300 °F |

| | | |
|---|---|---|
| russet-brown<br>↓<br>darker russet-brown | 6738<br><br>6739 | 0↑1400 °F<br><br>0↑1500 °F<br>(followed at «brown [tends towards olive-green]») |
| dark russet-brown | 6740 | mineral : peridotite<br>rock : medium grey<br>powder : medium brownish grey (green reflection)<br>origin : Thetford Mines, Québec<br><br><u>production process:</u><br>(followed from «chocolate-brown more accentuated than "dark chocolate-brown"»)<br>rock irradiated with gamma rays at 484.704 Mrad |
| blackish russet-brown | 6741 | mineral : haematite<br>rock : medium chocolate-brown<br>powder : medium chocolate-brown<br>origin : Nouveau Québec, Québec<br><br><u>production process:</u><br>2 g of haematite + 2 g of sodium carbonate / 0↑1800 °F + 1 h at 1800 °F (dark chocolate-brown [red tone]) / irradiated with gamma rays at 63.88 Mrad<br>(followed at «dark brownish grey») |
| caramel-brown | | |
| pale caramel-brown<br>↓<br>darker caramel-brown ↓<br>↓<br>darker caramel-brown | 6742<br><br>6743<br><br><br>6744 | mineral : andulusite<br>rock : light brownish grey<br>powder : light grey<br>origin : Bimbowrie, South Australia<br><br><u>production process:</u><br>(followed from «greyish brown»)<br>powder irradiated with gamma rays at:<br>247.6 Mrad<br><br>287.3 Mrad[765]<br><br>360 Mrad<br>(followed at «medium milky chocolate-brown [grey tone]») |
| | | mineral : Gaspé agate<br>rock : marbled nodule with shaded tints of white, pink and grey, slightly translucid<br>powder : very light pinkish grey<br>origin : Mont Lyall, Gaspésie, Québec |

1269

| | | |
|---|---|---|
| light caramel-brown | 6745 | <u>production process:</u><br>4 g of agate + 40 ml hydrochloric acid / soaking: 1 wk. / separation of the liquid and the solid / natural drying (colour of the liquid: apple-green [orange tone]) / irradiated with gamma rays at 64.7 Mrad<br>(followed at «medium milky chocolate-brown») |
| light caramel-brown | 6746 | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>sheet heated 0↑2000 °F (light golden yellow) and grinded: .2 g + 50 cc of transparent polyester resin + 1% of catalyst / manual grinding / moulding / hardening (very light grey [light yellow reflection]) / irradiated with gamma rays at 11.4 Mrad |
| caramel-brown a bit more intense and dark than «light caramel-brown» | 6747 | mineral : siderite<br>rock : caramel-brown (grey tone)<br>powder : light beige (orange tone)<br>origin : De-Mix quarry, North side of Mont Saint-Hilaire, Rouville county, Québec<br><br><u>production process:</u><br>1 g of siderite + 1 cc of white transparent synthetic enamel paint used for the car / manual grinding / application on a piece of steel sheet used for the car's body measuring 1" x 1" (light caramel-brown) / irradiated with gamma rays at 10 Mrad<br>(followed at «intense brown [with "orange-caramel" traces]») |
| caramel-brown | 6748 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>rock irradiated with electrons at 164,800 rad<br>(followed at «medium amber-brown [orange tone]») |

1269

| | | |
|---|---|---|
| | | mineral : galena<br>rock : dark grey, with metallic brilliance<br>powder : dark grey, with metallic brilliance<br>origin : Trail, British Columbia |
| caramel-brown | 6748.1 | <u>production process</u>:<br>the round end of the pyrex test tube is heated with an oxyacetylene torch / then, 5 g of galena is sprinkled at the surface in fusion / the galena adheres and the entity is immediately brought back at the state of fusion with the torch / the cooling in ambient air is immediate (caramel-orange [green reflection]) / irradiated with gamma rays at 9.88 Mrad |
| | | <u>production process</u>:<br>(followed from «brownish green»)<br>4 g of powdered galena are deposited on a piece of stainless steel measuring 1" x 1": |
| caramel-brown<br>↓ | 6749 | 1500 °F / 20 min.[280] / immediate removal |
| darker caramel-brown | 6750 | 1600 °F / 20 min.[280] / immediate removal<br>(followed at «blackish brown») |
| | | mineral : siderite<br>rock : caramel-brown (grey tone)<br>powder : light beige (orange tone)<br>origin : De-Mix quarry, North side of Mont Saint-Hilaire, Rouville county, Québec |
| caramel-brown a bit darker than «caramel-brown» | 6751 | <u>production process</u>:<br>rock irradiated with electrons at 164,800 rad |
| | | mineral : biotite gneiss<br>rock : blackish grey, golden vitreous brilliance<br>powder : dark grey<br>origin : Grenville geological province, Québec |
| medium caramel-brown (golden reflection) | 6751.1 | <u>production process</u>:<br>1 g of gneiss + 6.50 g of powdered glass (spruce pine batch) / manual grinding / deposited on a ceramic plate at the state of a biscuit / heated in a furnace 0↑1000 °C in ambient air / slow cooling in furnace[1277] |
| | | mineral : peridotite<br>rock : medium grey |

1270

| | | |
|---|---|---|
| | | powder : medium brownish grey (green reflection)<br>origin : Thetford Mines, Québec<br><br>production process: |
| medium caramel-brown | 6751.2 | 1 g of peridotite + 5 g of pyrex / manual grinding / heating: 5 °C per min. 0†1245 °C + maintenance during 1 h / slow cooling: 5 °C per min. until ambient temperature is reached / the entity is done in ambient air |
| | | mineral : andulusite<br>rock : light brownish grey<br>powder : light grey<br>origin : Bimbowrie, South Australia<br><br>production process: |
| medium caramel-brown | 6751.3 | 1 g of andulusite + 5 g of pyrex / manual grinding / heating: 5 °C per min. 0†1245 °C + maintenance during 1 h / cooling: 5 °C per min. until ambient temperature is reached / the entity is done in ambient air (very, very light pinkish beige) / irradiated with gamma rays at 9.88 Mrad |
| | | mineral : idocrase<br>rock : yellowish green<br>powder : beige (green tone)<br>origin : Jeffrey Mine, Asbestos (presently J.-M. Asbestos), Québec<br><br>production process: |
| pronounced caramel-brown | 6752 | 1500 °F / 1 h (light beige [light green tone]) / rock irradiated with gamma rays at 64.7 Mrad[766] (followed at «pale brown») |
| | | mineral : asbestos[4]<br>rock : dark grey (green reflection)<br>powder : light grey (green reflection)<br>origin : Asbestos Corporation Ltd., Thetford Mines, Québec<br><br>production process: |
| dark caramel-brown | 6753 | 5 g of asbestos + 80 ml nitric acid / soaking: 2 wk. / drying on hot plate (dark orange-brown): .50 g + .50 g of sodium carbonate / 1800 °F / 1 h |
| | | mineral : galena<br>rock : dark grey, with metallic brilliance<br>powder : dark grey, with metallic brilliance<br>origin : Trail, British Columbia<br><br>mineral : sulphur |

1271

| | | |
|---|---|---|
| dark caramel-brown | 6754 | rock : brilliant yellow<br>powder : brilliant yellow<br>origin : unknown<br><br><u>production process</u>:<br>(followed from «black»)<br>10 g of powdered galena + 10 g of sulphur / grinded and distributed in 8 porcelain covers usually used with porcelain crucibles / 0↑1500 °F280<br>(followed at «caramel-brown [orange-yellow tone with a green reflection]») |
| | | mineral : sylvite<br>rock : colourless<br>powder : colourless<br>origin : Strassfurt, Prussia, Germany<br><br><u>production process</u>:<br>(followed from «brownish grey»)<br>rock irradiated with neutrons at $10^{12}$ neutrons / $cm^2$ / sec during: |
| intense caramel-brown<br>↓ | 6755 | 1,000 seconds |
| more intense caramel-brown<br>↓ | 6756 | 1,500 seconds |
| caramel-brown much more intense and accentuated<br>↓ | 6757 | 2,000 seconds |
| caramel-brown still more intense<br>↓ | 6758 | 3,000 seconds |
| caramel-brown much more intense<br>↓ | 6759 | 6,000 seconds |
| dark caramel-brown<br>↓ | 6760 | 10,000 seconds |
| very dark caramel-brown<br>↓ | 6761 | 20,000 seconds |
| blackish caramel-brown | 6762 | 40,000 seconds |
| caramel-brown (blue tone) | | |
| | | mineral : tremolite<br>rock : medium brown (evergreen tone) |

| | | |
|---|---|---|
| dark caramel-brown (localized blue reflection) | 6762.1 | powder : greyish beige<br>origin : Tetreault Mine, Montauban, Portneuf county, Québec<br><br><u>production process:</u><br>1 g of tremolite + 5 g of pyrex / manual grinding / heating: 5 °C per min. 0↑1245 °C + maintenance during 1 h / cooling: 5 °C per min. until ambient temperature is reached / the entity is done in ambient air (medium yellow ochre) / irradiated with gamma rays at 9.88 Mrad |
| caramel-brown (green tone) | | |
| pale caramel-brown (green reflection) | 6763 | mineral : diopside<br>rock : light grey<br>powder : light beige<br>origin : Mont-Orford, Québec<br><br><u>production process:</u><br>(followed from «beige-grey [green tone]»)<br>rock irradiated with gamma[67] rays at 482.984 Mrad |
| | | mineral : antigorite<br>rock : pale yellowish green<br>powder : very pale greenish yellow<br>origin : Canadian Refractories Mine, Kilmar, Québec<br><br><u>production process:</u><br>(followed from «yellowish green [caramel or orange tone]»)<br>rock irradiated with gamma rays at: |
| caramel-brown (light green tone) | 6764 | 57.4 Mrad[767] |
| | 6765 | 65.704 Mrad |
| caramel-brown a bit darker (light green tone) | 6766 | 102.4 Mrad |
| caramel-brown a bit darker (light green tone) | 6767 | 148.4 Mrad |
| caramel-brown (light green tone) still darker | 6768 | 201.6 Mrad |

| | | |
|---|---|---|
| ↓ | 6769 | 244.53 Mrad |
| dark caramel-brown (light green tone) | 6770 | 247.6 Mrad[768] (followed at «caramel-brown [greenish orange tone]») |
| caramel-brown (green and grey tones) | | |
| caramel-brown (green and grey tones) | 6771 | mineral : sandstone<br>rock : medium pinkish brown (light violet tone)<br>powder : medium pinkish brown (light violet tone)<br>origin : at the rear of Percé, Gaspésie, Québec<br>production process:<br>(followed from «olive-green»)<br>2 g of sandstone + 2 g of sodium carbonate / 0↑1900 °F + 1 h at 1900 °F |
| dark caramel-brown (green reflection and grey tone) | 6771.1 | mineral : iron sulphide / nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br>production process:<br>(followed from «medium green [between "mint-green" and "grass-green"]»)<br>1% of iron sulphide / nickel is mixed with molten glass and the entity is melted at 2,400 °F (medium green [between «mint-green» and «grass-green»]) / irradiated with gamma rays at:<br>4.94 Mrad |
| ↓ caramel-brown a bit darker (green reflection and grey tone) | 6771.2 | 7.41 Mrad<br>(followed at «amber-brown») |
| caramel-brown (greenish yellow tone) | | |
| | | mineral : galena<br>rock : dark grey, with metallic brilliance<br>powder : dark grey, with metallic brilliance<br>origin : Trail, British Columbia<br><br>mineral : sulphur |

| | | |
|---|---|---|
| dark caramel-brown (greenish yellow tone) | 6772 | rock : brilliant yellow<br>powder : brilliant yellow<br>origin : unknown<br>production process:<br>(followed from «reddish amber-brown [accentuated yellow tone]»)<br>10 g of powdered galena + 10 g of sulphur / grinded and distributed in 8 porcelain covers usually used with porcelain crucibles /<br>0†1900 ºF119,280,769,783 |
| caramel-brown (orange-yellow tone and green reflection) | | |
| caramel-brown (orange-yellow tone and green reflection) lighter than «dark caramel-brown (orange-yellow tone) | 6773 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br>production process:<br>(followed from «dark caramel-brown»)<br>10 g of powdered galena + 10 g of sulphur / grinded and distributed in 8 porcelain covers usually used with porcelain crucibles /<br>0†1600 ºF280,770 |
| ↓<br>caramel-brown (orange-yellow tone and green reflection) much more intense | 6774 | 0†1700 ºF280<br><br>(followed at «reddish amber-brown [accentuated yellow tone]») |
| caramel-brown (orange tone) | | |
| | | mineral : antigorite<br>rock : pale yellowish green<br>powder : very pale greenish yellow<br>origin : Canadian Refractories Mine, Kilmar, Québec<br>production process:<br>(followed from «caramel-brown [greenish orange tone]»)<br>rock irradiated with gamma rays at: |

| | | |
|---|---|---|
| caramel-brown (orange tone) a bit darker than «dark caramel-brown (orange tone)» | 6775 | 360 Mrad |
| ↓ | | |
| caramel-brown (orange tone) still lightly darker | 6776 | 425.704 Mrad<br><br>(followed at «medium chocolate-brown») |
| | | mineral : galena<br>rock : dark grey, with metallic brilliance<br>powder : dark grey, with metallic brilliance<br>origin : Trail, British Columbia<br><u>production process:</u><br>(followed from «medium chocolate-brown [light red tone]»)<br>1 g of galena + 1 g of sodium carbonate / grinded and distributed in porcelain covers usually used with porcelain crucibles: |
| caramel-brown (orange tone) | 6777 | 0↑1700 °F[280,771] |
| ↓ | | (followed at «brown ochre [red tone]»)<br>(followed from «brown ochre [red tone]») |
| caramel-brown (orange tone) | 6778 | 0↑1900 °F[280,772] |
| | | mineral : siderite<br>rock : caramel-brown (grey tone)<br>powder : light beige (orange tone)<br>origin : De-Mix quarry, North side of Mont Saint-Hilaire, Rouville county, Québec<br><u>production process:</u><br>(followed from «caramel-brown [grey tone]»)<br>rock irradiated with gamma rays at: |
| caramel-brown (orange tone) | 6779 | 57.4 Mrad |
| caramel-brown (orange tone) | 6780 | 63.984 Mrad |
| | 6781 | 102.4 Mrad |
| ↓ | 6782 | 148.4 Mrad |
| | 6783 | 201.6 Mrad |
| darkens | 6784 | 242.804 Mrad<br>(followed at «caramel-brown [reddish orange tone]») |
| | | mineral : halite[41]<br>rock : colourless<br>powder : colourless |

| | | |
|---|---|---|
| medium caramel-brown (orange tone) | 6785 | origin : Seleine Mine, Iles-de-la-Madeleine, Québec<br><br>mineral : cement[1138]<br>powder : white<br><br>production process:<br>5 g of rocks of various sizes + 13.74 g of cement + 6.50 cc of water / manual mixing / moulding / hardening / irradiated with gamma rays at 18.85 Mrad[773] / colour of the rocks<br>(followed at «caramel-orange») |
| medium caramel-brown (orange tone) | 6785.1 | mineral : crystalline quartz<br>rock : colourless<br>origin : Adam Farm, Bonsecours, Eastern Townships, Québec<br><br>production process:<br>1 g of quartz + 5 g of pyrex / manual grinding / heating: 5 °C per min. 0↑1245 °C + maintenance during 1 h / cooling: 5 °C per min. until ambient temperature is reached / the entity is done in ambient air (crystalline white [with «dark greyish brown» particles]) / irradiated with gamma rays at 4.94 Mrad<br>(followed at «amber-brown [grey metallic tone]») |
| caramel-brown (greenish orange tone) | | |
| caramel-brown (greenish orange tone), a bit darker than «dark caramel-brown (greenish orange tone)» | 6786 | mineral : antigorite<br>rock : pale yellowish green<br>powder : very pale greenish yellow<br>origin : Canadian Refractories Mine, Kilmar, Québec<br><br>production process:<br>(followed from «dark caramel-brown [light green tone]»)<br>rock irradiated with gamma rays at 287.3 Mrad<br><br>(followed at «orange caramel-brown a bit darker than "dark orange caramel-brown"») |
| orange caramel-brown (violet-pink tone) | | |
| | | mineral : fluorine<br>rock : colourless<br>powder : colourless<br>origin : Ohio, United States |

1277

| | | |
|---|---|---|
| medium orange caramel-brown (violet-pink tone) | 6786.1 | production process: 1 g of fluorine + 5 g of pyrex / manual grinding / heating: 5 °C per min. 0↑1245 °C + maintenance during 1 h / cooling: 5 °C per min. until ambient temperature is reached / the entity is done in ambient air (milky white) / irradiated with gamma rays at 4.94 Mrad (followed at «amber-brown [accentuated violet-pink tone]») |
| medium orange caramel-brown (violet-pink tone) | 6786.1 | mineral : fluorine<br>rock : very light yellow, translucid<br>powder : white (light yellow reflection)<br>origin : Saint-Lawrence Fluorspar Company, Saint-Lawrence, Newfoundland<br>production process: 1 g of fluorine + 5 g of pyrex / manual grinding / heating: 5 °C per min. 0↑1245 °C + maintenance during 1 h / cooling: 5 °C per min. until ambient temperature is reached / the entity is done in ambient air (crystalline white) / irradiated with gamma rays at 4.94 Mrad (followed at «amber-brown [accentuated violet-pink tone]») |
| caramel-brown (reddish orange tone) | | |
| | | mineral : siderite<br>rock : caramel-brown (grey tone)<br>powder : light beige (orange tone)<br>origin : De-Mix quarry, North side of Mont Saint-Hilaire, Rouville county, Québec<br>production process: (followed from «caramel-brown [orange tone]»)<br>rock irradiated with gamma rays at: |
| caramel-brown (reddish orange tone) ↓ | 6787 | 247.6 Mrad |
| darker caramel-brown (reddish orange tone) ↓ | 6788 | 287.3 Mrad |
| still darker caramel-brown (reddish orange tone) | 6789 | 360 Mrad<br>(followed at «dark chocolate-brown [red tone]») |
| caramel-brown (pink tone) | | |
| | | mineral : sulphur<br>rock : brilliant yellow<br>powder : brilliant yellow<br>origin : unknown |

| | | |
|---|---|---|
| medium orange caramel-brown (very light pink tone) | 6789a | production process:<br>(followed from «medium caramel-beige [orange tone]»)<br>1 g of sulphur + 5 g of pyrex / manual grinding / heating: 5 °C per min. until 1245 °C is reached + maintenance during 1 h / cooling: 5 °C per min. until ambient temperature is reached / the entity is done in ambient air (milky white [with «dark greyish brown» particles]) / irradiated with gamma rays at 9.88 Mrad |
| caramel-brown (red tone) | | |
| dark caramel-brown (red tone) [with localized «dark green» spots | 6789.1 | mineral : chrome<br>powder : light grey, with metallic brilliance<br><br>production process:<br>1 g of chrome + 5 g of pyrex / manual grinding / heating: 5 °C per min. until 1245 °C is reached + maintenance during 1 h / cooling: 5 °C per min. until ambient temperature is reached / the entity is done in ambient air (dark greyish brown [with localized green spots]) / irradiated with gamma rays at 9.88 Mrad |
| caramel-brown (grey tone) | | |
| light caramel-brown (grey reflection)<br>↓ | 6790 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>(followed from «greyish brown»)<br>granules[774] irradiated with gamma rays at:<br>247.6 Mrad |
| darker caramel-brown (grey reflection) | 6791 | 287.3 Mrad[775]<br>(followed at «dark brown [grey reflection]») |
| caramel-brown (grey | 6792 | mineral : siderite<br>rock : caramel-brown (grey tone)<br>powder : light beige (orange tone)<br>origin : De-Mix quarry, North side of Mont Saint-Hilaire, Rouville county, Québec<br><br>production process:<br>rock irradiated with gamma rays at:<br>5 Mrad |

1279

| | | |
|---|---|---|
| tone) more intense than «caramel-brown (grey tone)» ↓ caramel-brown (grey tone) a bit more accentuated | 6793 | 10 Mrad (followed at «caramel-brown [orange tone]») |
| medium caramel-brown (localized grey reflection) | 6793.1 | mineral : sodalite<br>rock : indigo-blue, slightly translucid<br>powder : light grey (light blue tone)<br>origin : possibly Africa<br><br>production process:<br>1 g of sodalite + 5 g of pyrex / manual grinding / heating: 5 °C per min. until 1245 °C is reached + maintenance during 1 h / cooling: 5 °C per min. until ambient temperature is reached / the entity is done in ambient air (light greyish beige) / irradiated with gamma rays at 9.88 Mrad |
| amber-brown | | |
| very, very light amber-browr reflection ↓ | 6794 | mineral : crystalline quartz<br>rock : colourless<br>origin : Adam Farm, Bonsecours, Eastern Townships, Québec<br><br>production process:<br>rock irradiated with electrons at:<br>164,800 rad |
| very, very light amber-brown reflection | 6795 | 305,200 rad[73] |
| very light amber-brown | 6796 | mineral : crocidolite<br>rock : dark greyish blue<br>powder : pale greyish blue<br>origin : Griqualand district, South Africa<br><br>production process:<br>4 g of crocidolite + 50 ml phosphoric acid / soaking: 2 wk. / drying on hot plate (still humid) / colour of the liquid[776] |
| | | mineral : antigorite<br>rock : pale yellowish green<br>powder : very pale greenish yellow<br>origin : Canadian Refractories Mine, Kilmar, Québec |

| | | |
|---|---|---|
| very light amber-brown | 6797 | production process:<br>2 g of antigorite + 20 ml phosphoric acid / soaking: 3 d. / drying on hot plate (still humid) / colour of the liquid[77] |
| very light amber-brown | 6798 | mineral : calcite<br>rock : light pink<br>powder : pinkish white<br>origin : Huddersfield district, Pontiac county, Québec<br><br>production process:<br>2 g of calcite + 20 ml phosphoric acid / soaking: 3 d. / drying on hot plate (still humid) / colour of the liquid[119,160] |
| very light amber-brown | 6799 | mineral : halite[41]<br>rock : colourless<br>powder : colourless<br>origin : Seleine Mine, Iles-de-la-Madeleine, Québec<br><br>production process:<br>2 g of halite + 20 ml ether / natural drying (very, very light grey) / irradiated with gamma rays at 18.85 Mrad |
| very light amber-brown | 6800 | production process:<br>powder irradiated with gamma rays at 18.85 Mrad[777] |
| light amber-brown | 6801 | mineral : calcite (with clayey inclusions)<br>rock : very light creamy yellow, translucid<br>powder : white<br>origin : De-Mix quarry, near Saint-Philippe de Laprairie, Québec<br><br>production process:<br>4 g of calcite + 40 ml hydrochloric acid / soaking: 1 wk. / drying on hot plate (white) / irradiated with electrons at 305,200 rad[73] |
| light amber-brown | 6802 | mineral : fluorine<br>rock : very light yellow, translucid<br>powder : white (grey reflection)<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (yellow): .2 g + |

| | | |
|---|---|---|
| | | 50 cc of transparent polyester resin + 1% of catalyst / manual grinding / moulding / hardening (very light greenish grey) / irradiated with gamma rays at 11.4 Mrad |
| light brown (light amber tone) | 6803 | mineral : orthoclase<br>rock : white (grey reflection)<br>powder : white (grey reflection)<br>origin : mine near Buckingham, Papineau county, Québec<br><br>production process:<br>rock entirely covered with 20 ml hydrochloric acid / soaking: 2 wk. / irradiated with gamma rays at 5.7 Mrad / drying on sand bath, completed on hot plate[778] |
| amber-brown a bit darker than «light amber-brown» | 6803.1 | mineral : crystalline quartz<br>rock : colourless<br>origin : Adam Farm, Bonsecours, Eastern Townships, Québec<br><br>production process:<br>rock hermetically wrapped in bread dough / 150 °F / 2 h / immediately irradiated when hot[1268] with gamma rays at 2.26 Mrad[1278] |
| amber-brown darker than «light amber-brown» | 6803.2 | production process:<br>rock hermetically wrapped in bread dough / 150 °F / 2 h / immediately cooled at -20 °C / 2 h / immediately irradiated at -20 °C with gamma rays at 2.26 Mrad[1278] |
| amber-brown | 6803.3 | production process:<br>rock heated at 150 °F / 2 h / immediately deposited at -20 °C / 2 h / immediately irradiated at -20 °C with gamma rays at 2.26 Mrad[1278] |
| amber-brown | 6804 | mineral : apophyllite<br>rock : milky white, translucid<br>powder : white<br>origin : Gaspé Copper Mine, Gaspé, Québec<br><br>production process:<br>(followed from «amber-brown [orange tone]»)<br>rock irradiated with gamma rays at 424.7 Mrad[779] |
| | | mineral : mussel shell or calcium carbonate<br>shell : dark indigo-blue (violet tone)<br>powder : white |

| | | |
|---|---|---|
| | | origin : St.-Lawrence river, Baie-des-Chaleurs, Gaspésie, Québec |
| amber-brown | 6805 | <u>production process:</u><br>.50 g of powder + 50 ml sulphuric acid / soaking: 2 wk. / drying on hot plate[119] |
| | | mineral : halite[41]<br>rock : colourless<br>powder : colourless<br>origin : Seleine Mine, Iles-de-la-Madeleine, Québec |
| amber-brown | 6806 | <u>production process:</u><br>rock measuring 4" x 3 1/4" x 1 3/4" of thickness at its maximum and 3/4" at its minimum, irradiated with electrons at 150,000 rad[780] |
| | | mineral : steatite<br>rock : cold light grey, slightly translucid<br>powder : light grey<br>origin : East Broughton, Québec |
| amber-brown<br>↓ | 6807 | <u>production process:</u><br>0↑1600 °F (brownish grey): 2 g + 20 ml hydrochloric acid + 5 ml nitric acid / soaking: 3 d. / drying on hot plate |
| amber-brown a bit more brown<br>↓ | 6808 | 0↑1600 °F (brownish grey): 2 g + 15 ml hydrochloric acid + 10 ml nitric acid / soaking: 3 d. / drying on hot plate |
| amber-brown still more brown | 6809 | 0↑1600 °F (brownish grey): 2 g + 10 ml hydrochloric acid + 15 ml nitric acid / soaking: 3 d. / drying on hot plate<br>(followed at «light beige») |
| | | mineral : iron sulphide / nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |
| | | <u>production process:</u><br>(followed from «dark caramel-brown [green reflection and grey tone]») |
| amber-brown darker than «dark amber-brown» | 6909.1 | 1% of iron sulphide / nickel is mixed with the molten paste and the entity is melted at 2,400 °F (medium green [between «mint-green» and «grass- |

| | | |
|---|---|---|
| | | green»]) / irradiated with gamma rays at 9.88 Mrad |
| amber-brown (yellow tone) | | |
| amber-brown (yellow reflection) a bit darker than «amber-brown (yellow reflection)» | 6809.2 | mineral : crystalline quartz<br>rock : colourless<br>origin : Adam Farm, Bonsecours, Eastern Townships, Québec<br><br>production process:<br>rock heated at 150 °F / 2 h / cooled in ambient air / irradiated with gamma rays at 2.26 Mrad |
| amber-brown (orange-yellow tone) | | |
| amber-brown (orange-yellow tone) | 6810 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «dark caramel-brown [greenish yellow tone]»)<br>10 g of powdered galena + 10 g of sulphur / grinded and distributed in 8 porcelain covers usually used with porcelain crucibles / 0↑2000 °F280<br>(followed at «amber-brown [greenish orange-yellow tone]») |
| amber-brown (greenish orange-yellow tone) | | |
| amber-brown (greenish orange-yellow tone) | 6811 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «amber-brown [orange-yellow tone]»)<br>10 g of powdered galena + 10 g of sulphur / grinded and distributed in 8 porcelain covers usually used with porcelain crucibles / 0↑2050 °F280 |

| | | |
|---|---|---|
| amber-brown (orange tone) | | |
| very light amber-brown (orange tone) | 6812 | mineral : halite[41]<br>rock : colourless<br>powder : colourless<br>origin : Seleine Mine, Iles-de-la-Madeleine, Québec<br><br>production process:<br>2 g of halite + 20 ml ammonia / natural drying (white) / irradiated with gamma rays at 18.85 Mrad |
| very light amber-brown (orange tone) | 6813 | production process:<br>2 g of halite + 20 ml hydrochloric acid / soaking: 3 d. / drying on hot plate (transparent white [light yellow reflection]) / irradiated with gamma rays at 18.85 Mrad[782] |
| amber-brown (orange reflection) more intense than «amber-brown (orange reflection)» | 6814 | mineral : steatite<br>rock : ccid light grey, slightly translucid<br>powder : light grey<br>origin : East Broughton, Québec<br><br>production process:<br>(followed from «amber-brown [light pink reflection] darker than "amber-brown [pink reflection]"») 0↑1600 °F (brownish grey): 2 g - 10 ml hydrochloric acid + 15 ml nitric acid / soaking: 3 d. / drying on hot plate (amber-brown): .3 g + 50 cc of transparent polyester resin + 1% of catalyst / manual grinding / moulding / hardening (amber-brown [light pink reflection]) / irradiated with electrons at 305,082 rad[354] |
| amber-brown (orange reflection) | 6814.1 | mineral : crystalline quartz<br>rock : colourless<br>origin : Adam Farm, Bonsecours, Eastern Townships, Québec<br><br>production process:<br>rock heated at 150 °F / 2 h / immediately deposited in an insulating material and irradiated when hot with gamma rays at 2.26 Mrad[1178,1279] |
| | | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the |

1285

| | | |
|---|---|---|
| | | North of Saint-Urbain, Québec<br><br>production process:<br>10 g of silica + 100 ml hydrochloric acid / soaking: 1 wk. / drying on hot plate (light and vivid rusty orange): .2 g + 50 cc of transparent polyester resin + 1% of catalyst / manual grinding / moulding / hardening (medium amber-brown [orange tone]) / irradiated with electrons at: |
| amber-brown (orange tone) more brown than «medium amber-brown (orange tone)» | 6815 | 155,082 rad |
| amber-brown more intense (light orange tone) | 6816 | 305,082 rad[354] |
| | | mineral : fluorine<br>rock : very light yellow, translucid<br>powder : white (grey reflection)<br>origin : Saint-Lawrence Fluorspar Company, Saint-Lawrence, Newfoundland<br><br>production process:<br>(followed from «caramel-brown») |
| medium amber-brown (orange tone) | 6817 | rock irradiated with electrons at 302,831 rad[45] |
| | | mineral : honey grossular garnet<br>rock : light pinkish beige, translucid<br>powder : very light beige<br>origin : Jeffrey Mine, Asbestos (presently J.-M. Asbestos), Québec<br><br>production process: |
| medium amber-brown (orange tone) | 6817.1 | 1 g of garnet + 5 g of pyrex / manual grinding / heating: 5 °C per min. 0↑1245 °C + maintenance during 1 h / cooling: 5 °C per min. until ambient temperature is reached / the entity is done in ambient air (medium greyish brown) / irradiated with gamma rays at 9.88 Mrad |
| | | mineral : graphite<br>rock : dark grey, with metallic brilliance<br>powder : dark grey, with metallic brilliance<br>origin : Grenville, Québec |

| | | |
|---|---|---|
| dark amber-brown (orange tone) | 6817.2 | <u>production process:</u> 1 g of graphite + 5 g of pyrex / manual grinding / heating: 5 °C per min. 0↑1245 °C + maintenance during 1 h / cooling: 5 °C per min. until ambient temperature is reached / the entity is done in ambient air (light greyish brown) / irradiated with gamma rays at 9.88 Mrad |
| amber-brown (pink tone) | | |
| amber-brown (light pink reflection) darker than «amber-brown (light pink reflection)» | 6818 | mineral : steatite<br>rock : cold light grey, slightly translucid<br>powder : light grey<br>origin : East Broughton, Québec<br><br><u>production process:</u> 0↑1600 °F (brownish grey): 2 g + 10 ml hydrochloric acid + 15 ml nitric acid / soaking: 3 d. / drying on hot plate (amber-brown): .3 g + 50 cc of transparent polyester resin + 1% of catalyst / manual grinding / moulding / hardening (amber-brown [light pink reflection]) / irradiated with electrons at 155,082 rad<br>(followed at «amber-brown [orange reflection] more intense than "amber-brown [orange reflection]"») |
| amber-brown (violet-pink tone) | | |
| amber-brown (accentuated violet-pink tone) | 6818.1 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u> 1 g of calcite + 5 g of pyrex / manual grinding / heating: 5 °C per min. 0↑1245 °C + maintenance during 1 h / cooling: 5 °C per min. until ambient temperature is reached / the entity is done in ambient air (very, very pale azure-blue) / irradiated with gamma rays at 9.88 Mrad |
| | | mineral : fluorine<br>rock : colourless<br>powder : colourless<br>origin : Ohio, United States<br><br><u>production process:</u> (followed from «medium orange caramel-brown [violet-pink tone]») |

1287

| | | |
|---|---|---|
| amber-brown (accentuated violet-pink tone) | 6818.2 | 1 g of fluorine + 5 g of pyrex / manual grinding / heating: 5 °C per min. 0↑1245 °C + maintenance during 1 h / cooling: 5 °C per min. until ambient temperature is reached / the entity is done in ambient air (milky white) / irradiated with gamma rays at 9.88 Mrad |
| amber-brown (accentuated violet-pink tone) | 6818.3 | mineral : fluorine<br>rock : very light yellow, translucid<br>powder : white (grey reflection)<br>origin : Saint-Lawrence Fluorspar Company, Saint-Lawrence, Newfoundland<br><br>production process:<br>(followed from «medium orange caramel-brown [violet-pink tone]»)<br>1 g of fluorine + 5 g of pyrex / manual grinding / heating: 5 °C per min. 0↑1245 °C + maintenance during 1 h / cooling: 5 °C per min. until ambient temperature is reached / the entity is done in ambient air (cristalline white) / irradiated with gamma rays at 9.88 Mrad |
| amber-brown (orange-pink tone) | | |
| amber-brown (light orange-pink reflection) | 6819 | mineral : steatite<br>rock : cold light grey, slightly translucid<br>powder : light grey<br>origin : East Broughton, Québec<br><br>production process:<br>0↑1600 °F (brownish grey): 2 g + 10 ml hydrochloric acid + 15 ml nitric acid / soaking: 3 d. / drying on hot plate (amber-brown): .3 g + 50 cc of transparent polyester resin + 1% of catalyst / manual grinding / moulding / hardening (amber-brown [light pink reflection]) / irradiated with gamma rays at 5.7 Mrad |
| amber-brown (red tone) | | |
| dark reddish amber-brown tone | 6819.1 | mineral : asbestos[4]<br>rock : dark grey (green reflection)<br>powder : light grey (green reflection)<br>origin : Asbestos Corporation Ltd., Thetford Mines, Québec<br><br>production process:<br>0↑1900 °F (chamois [light orange tone]): 50 g + 200 ml hydrochloric acid or asbestos entirely covered with hydrochloric acid / soaking: 1 wk. / drying on hot plate (vivid sunny yellow [light |

1298

| | | |
|---|---|---|
| | | green tone]): 1 g + 5 g of pyrex / manual grinding / heating: 5 °C per min. 0↑1245 °C + maintenance during 1 h / cooling: 5 °C per min. until ambient temperature is reached / the entity is done in ambient air (medium iron-grey) / irradiated with gamma rays at 9.88 Mrad |
| very dark reddish amber-brown | 6819.2 | mineral : anorthosite<br>rock : dark grey<br>powder : medium grey<br>origin : Jonquière, Lac Saint-Jean, Québec<br><br>production process:<br>1 g of anorthosite + 5 g of pyrex / manual grinding / heating: 5 °C per min. 0↑1245 °C + maintenance during 1 h / cooling: 5 °C per min. until ambient temperature is reached / the entity is done in ambient air (medium iron-grey) / irradiated with gamma rays at 9.88 Mrad |
| amber-brown (red tone and blue reflection) | | |
| dark reddish amber-brown and localized blue reflection | 6819.3 | mineral : vesuvianite<br>rock : lilac, opaque<br>powder : lilac<br>origin : John Manaville Mine, Asbestos, Québec<br><br>production process:<br>1 g of vesuvianite + 5 g of pyrex / manual grinding / heating: 5 °C per min. 0↑1245 °C + maintenance during 1 h / cooling: 5 °C per min. until ambient temperature is reached / the entity is done in ambient air (medium yellow ochre [green tone]) / irradiated with gamma rays at 9.88 Mrad |
| reddish amber-brown (yellow tone) | | |
| reddish amber-brown (accentuated | 6820 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «caramel-brown [orange-yellow tone with green reflection]»)<br>10 g of powdered galena + 10 g of sulphur / grinded and distributed in 8 porcelain covers usually |

| | | |
|---|---|---|
| yellow tone) | | used with porcelain crucibles / 0↑1800 °F[119,280] (followed at «dark caramel-brown [greenish yellow tone]») |
| amber-brown (orange-red tone) | | |
| | | mineral : mica<br>block : golden brown, with vitreous luster, translucid<br>sheet : light amber, with vitreous luster, translucid<br>origin Lac Vert mountain, region of Low, near Hincks, Québec<br><br>production process:<br>sheet irradiated with gamma[67,73,784] rays at: |
| light amber-brown | 6822 | 5 Mrad |
| which | 6823 | 10 Mrad |
| takes an | 6824 | 57.4 Mrad |
| orange-red | 6825 | 65.704 Mrad |
| tone, | 6826 | 102.4 Mrad |
| | 6827 | 148.4 Mrad |
| becomes more accen- | 6828 | 201.6 Mrad |
| tuated, darkens | 6829 | 244.53 Mrad |
| and becomes more | 6830 | 247.6 Mrad |
| opaque | 6831 | 287.3 Mrad |
| ↓ | 6832 | 360 Mrad |
| amber-brown (accen- | 6833 | 604.53 Mrad |
| tuated orange-red tone) darker and more opaque | | |
| amber-brown (grey tone) | | |
| light amber-brown (grey tone) | 6833.a | mineral : crystalline quartz<br>rock : colourless<br>origin : Adam Farm, Bonsecours, Eastern Townships, Québec<br>production process:<br>the rock is hermetically wrapped in bread dough / 150 °F / 2 h / cooling in ambient air / irradia- with gamma rays at 2.26 Mrad[1278] |
| amber-brown | 6833.1 | mineral : crystalline quartz<br>rock : colourless<br>origin : Adam Farm, Bonsecours, Eastern Townships, Québec<br>production process:<br>(followed from«medium caramel-brown [orange tone]»)<br>1 g of quartz + 5 g of pyrex / manual grinding / |

| | | |
|---|---|---|
| (metallic grey tone) | | / heating: 5 °C per min. 0↑1245 °C + maintenance during 1 h / cooling: 5 °C per min. until ambient temperature is reached / the entity is done in ambient air (crystalline white [with «dark grey-brown» particles]) / irradiated with gamma rays at 9.88 Mrad |
| medium amber-brown (grey tone) | 6834 | mineral : mussel shell or calcium carbonate<br>rock : dark indigo-blue (violet tone)<br>powder : white<br>origin : Saint-Lawrence river, Baie-des-Chaleurs, Gaspésie, Québec<br><br>production process:<br>(followed from «dark pinkish beige»)<br>shell irradiated with gamma rays at 484.704 Mrad |
| pinkish brown | | |
| very, very light pinkish brown | 6835 | mineral : asbestos[4]<br>rock : dark grey (green reflection)<br>powder : light grey (green reflection)<br>origin : Asbestos Corporation Ltd., Thetford-Mines, Québec<br>production process:<br>0↑1900 °F (chamois [light orange tone]): 50 g + 200 ml hydrochloric acid or asbestos entirely covered with hydrochloric acid / soaking: 1 wk. / / drying on hot plate (vivid sunny yellow [light green tone]): .50 g + .50 g of sodium carbonate / 1800 °F / 1 h |
| pinkish brown a bit more pale than «light pinkish brown» | 6836 | mineral : granite gneiss<br>rock : reddish beige<br>powder : medium pink (light brown tone)<br>origin : Lac Beauport, region of the city of Québec, Québec<br><br>mineral : sulphur<br>rock : brilliant yellow<br>powder : brilliant yellow<br>origin : unknown<br>production process:<br>2 g of gneiss + 2 g of sulphur / 1300 °F / 1 h (light chamois [orange-pink tone]) / irradiated with electrons at 302,831 rad[36] |
| | | mineral : crocidolite<br>rock : dark greyish blue |

| | | |
|---|---|---|
| light pinkish brown | 6837 | powder : pale greyish blue<br>origin : Griqualand district, South Africa<br><br>mineral : sulphur<br>rock : brilliant yellow<br>powder : brilliant yellow<br>origin : unknown<br><br>production process:<br>(followed from «light greyish brown»)<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours, the one at the bottom being dark green [light yellow tone]): 2 g + 12 g of sulphur / 1300 °F / 1 h[785]<br>(followed at «light brown») |
| light brown (pink reflection) | 6838 | mineral : orthoclase<br>rock : light pinkish beige<br>powder : very light beige<br>origin : mine near Buckingham, Papineau county, Québec<br><br>production process:<br>(followed from «pinkish beige [brown tone]»)<br>rock irradiated with gamma rays at 484.704 Mrad |
| light pinkish brown | 6839 | mineral : fuel oil soot[84]<br>powder : profound brownish black<br>origin : boiler room of Laval University, city of Québec, Québec<br><br>production process:<br>2 g of soot + 2 g of sodium carbonate / 0↑1300 °F + 1 h at 1300 °F (mixture of particles: brown / orange) / irradiated with electrons at 162,431 rad |
| pinkish brown darker and more intense than «light pinkish brown» | 6840 | mineral : apatite<br>rock : medium brownish red<br>powder : light pinkish beige<br>origin : Ile Calumet, Pontiac county, Québec<br><br>production process:<br>powder irradiated with gamma rays at 64.7 Mrad<br><br>(followed at «dark milky chocolate-brown») |

| | | |
|---|---|---|
| light pinkish brown | 6841 | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superposed layers of colours, the one at the bottom being dark green [light yellow tone]): 2 g + 2 g of sulphur / 500 °F / 1 h[785]<br>(followed at «chamois-brown») |
| pinkish brown | 6842 | mineral : apatite<br>rock : reddish brown<br>powder : light pinkish beige<br>origin : Calumet, Pontiac county, Québec<br><br>production process:<br>powder irradiated with gamma rays at 64.7 Mrad[787]<br>(followed at «salmon-brown or brown [orange-pink tone]») |
| brown (light pink tone) | 6843 | mineral : iron pyrite<br>powder : greyish brown with golden yellow metallic brilliance<br>origin : Rigaud Seigniory, Beauce county, Québec<br><br>production process:<br>1300 °F / 1 h |
| pinkish brown | 6844 | mineral : serpentine<br>rock : yellowish green<br>powder : light greenish yellow<br>origin : probably Thetford Mines, Eastern Townships, Québec<br><br>mineral : cement[1138]<br>powder : white<br><br>production process:<br>6 g of rocks of various sizes + 13.74 g of cement + 13 cc of water / manual mixing / moulding / |

| | | |
|---|---|---|
| | | hardening / 0↑1900 °F / irradiated with gamma rays at 18.85 Mrad |
| brown (light pink tone) | 6845 | mineral : fuel oil soot[84]<br>powder : profound brownish black<br>origin : boiler room of Laval University, city of Québec, Québec<br><br>production process:<br>(followed from «brown»)<br>2 g of soot + 2 g of sodium carbonate / 0↑1100 °F + 1 h at 1100 °F<br>(followed at «light brown [orange-pink tone]») |
| pinkish brown a bit more pale than «pinkish brown» | 6845.1 | mineral : shale (formation of Sillery[359])<br>rock : brownish red<br>powder : pinkish brown, mat<br>origin : bank of St.-Lawrence river at Berthier-Sur-Mer, at the rear of the Dénechaud manor, Québec<br><br>production process:<br>1 g of shale + 0.28122 g of MgO / grinding |
| | | production process:<br>powder irradiated with gamma rays at: |
| pinkish brown a bit darker [brown] than «pinkish brown» | 6846 | 5 Mrad |
| pinkish brown still a bit darker | 6847 | 10 Mrad |
| pinkish brown still a bit darker | 6848 | 57.4 Mrad |
| | 6849 | 65.704 Mrad |
| looses its pink tone | 6850 | 102.4 Mrad |
| | 6851 | 124.704 Mrad |
| | 6852 | 148.4 Mrad |
| | 6853 | 201.6 Mrad |
| | 6854 | 247.6 Mrad |
| ↓ | 6855 | 287.3 Mrad |
| progressively | 6856 | 360 Mrad<br>(followed at «medium chocolate-brown [light pink tone]») |
| pinkish brown a bit darker [brown] | 6857 | production process:<br>powder irradiated with electrons at 302,831 rad[34] |

| | | |
|---|---|---|
| than «pinkish brown» | | |
| medium pinkish brown | 6858 | mineral : crocidolite<br>rock : pale greyish blue<br>powder : pale greyish blue<br>origin : Griqualand district, South Africa<br><br><u>production process:</u><br>(followed from «orange-brown»)<br>2 g of crocidolite + 2 g of sodium carbonate / 0↑1300 °F + 1 h at 1300 °F (brown ochre [reddish orange tone]) / irradiated with gamma[239] rays at 424.7 Mrad |
| medium pinkish brown | 6859 | <u>production process:</u><br>(followed from «brown ochre [orange tone]»)<br>2 g of crocidolite + 2 g of sodium carbonate / 1300 °F / 1 h (brown ochre [reddish orange tone]) / irradiated with gamma[239] rays at 550.22 Mrad |
| medium pinkish brown | 6860 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>(followed from «pinkish beige»)<br>1 g of fluorine + 1 cc of white transparent synthetic enamel paint used for the car / manual grinding / application on a piece of steel sheet used for the car's body measuring 1" x 1" (medium beige) / irradiated with gamma[351,352] rays at 57.4 Mrad<br>(followed at «chocolate-brown a bit darker than "medium chocolate-brown"») |
| medium pinkish brown | 6861 | mineral : almandite<br>rock : dark brownish red<br>powder : medium brownish red<br>origin : Gore Mountain, Warren county, New York state, United States<br><u>production process:</u><br>(followed from «reddish brown»)<br>powder irradiated with gamma rays at 424.7 Mrad[788] |
| | | mineral : jade<br>rock : dark red (orange tone)<br>powder : reddish orange<br>origin : China |

| | | |
|---|---|---|
| medium pinkish brown | 6862 | <u>production process:</u><br>3 g of jade + 25 ml nitric acid / soaking: 24 h / drying on hot plate |
| medium pinkish brown | 6863 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br><u>production process:</u><br>(followed from «brownish grey [accentuated pink tone]»)<br>2 g of ochre + 1 g of titanium dioxide / 0↑1500 °F<br>(followed at «light orange-brown») |
| medium pinkish brown | 6864 | mineral : ochre[111]<br>powder : dark reddish brown<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><u>production process:</u><br>(followed from «medium chocolate-brown [pink tone]»)<br>1 g of ochre + 1 g of zirconium silicate + 1 g of sulphur / 0↑1700 °F |
| medium brown (light pink tone) | 6865 | mineral : shale (formation of Sillery[547])<br>rock : dark violet-mars[753]<br>powder : light violet-mars[753]<br>origin : small copper and nickel deposit, in the South-Western area of a mass of serpentinite, at 3 km at the West of Saint-Fabien-de-Panet, Québec<br><br><u>production process:</u><br>2000 °F / 45 min. |
| | | mineral : fuel oil soot[86] |

| | | |
|---|---|---|
| | | powder : profound brownish black<br>origin : boiler room of Laval University, city of Québec, Québec<br>production process:<br>(followed from «brown [orange-pink tone]»)<br>2 g of soot + 2 g of sodium carbonate / 1200 °F / 1 h (light brown [orange-pink tone]) / irradiated with gamma rays at 424.7 Mrad |
| medium pinkish brown | 6866 | |
| | | mineral : sandstone<br>rock : medium pinkish brown (light violet tone)<br>powder : medium pinkish brown (light violet tone)<br>origin : at the rear of Percé, Gaspésie, Québec<br>production process:<br>powder irradiated with gamma rays at: |
| medium pinkish | 6867 | 5 Mrad |
| brown which | 6868 | 10 Mrad |
| evolves | 6869 | 57.4 Mrad |
| towards | 6870 | 102.4 Mrad |
| pinkish brown darker and more accentuated than «medium pinkish brown» | 6871 | 148.4 Mrad |
| | 6872 | 201.6 Mrad |
| which ↓ becomes | 6873 | 247.6 Mrad |
| more and more beige | 6874 | 287.3 Mrad<br>(followed at «dark brownish beige») |
| | | mineral : ilmenite<br>rock : blackish grey, with metallic luster<br>powder : blackish grey, with metallic luster<br>origin : Québec Fer et Titane Co., Havre Saint-Pierre, Québec<br>production process: |
| pinkish brown lighter than «pinkish brown [between "medium and dark pinkish brown"]» | 6875 | 2 g of ilmenite + 2 g of sodium carbonate / 0↑1500 °F + 15 min. at 1500 °F (reddish orange-brown [between «medium reddish orange-brown» and «dark reddish orange-brown»]) / irradiated with gamma rays at 64.7 Mrad<br>(followed at «greyish brown [pink and orange reflections], between "light greyish brown [orange-pink tone]" and "medium greyish brown [orange-pink tone]"») |
| | | mineral : goethite[106]<br>powder : rusty orange<br>origin : Red Mill, in the suburbs of Cap-de-la-Madeleine, Québec |

| | | |
|---|---|---|
| pinkish brown [between «medium and dark pinkish brown»] | 6876 | <u>production process:</u><br>(followed from «pinkish red much more accentuated than "medium pinkish red"»)<br>0↑1400 °F / slow cooling in furnace (indian red[107]): 10 g + 100 ml sulphuric acid / soaking: 1 wk. / drying on hot plate (medium pinkish red) / irradiated with gamma[239] rays at 424.7 Mrad |
| | | mineral : apatite<br>rock : medium brownish red<br>powder : light pinkish beige<br>origin : Ile Calumet, Pontiac county, Québec<br><br><u>production process:</u><br>rock irradiated with gamma rays at: |
| medium pinkish brown which darkens and becomes ↓ dark pinkish brown | 6877<br>6878<br>6879<br>6880<br>6881<br>6882<br>6883 | 5 Mrad<br>10 Mrad<br>57.4 Mrad<br>102.4 Mrad<br>148.4 Mrad[789]<br>201.6 Mrad<br>247.6 Mrad<br>(followed at «dark chocolate-brown») |
| pinkish brown more pale than «dark pinkish brown» | 6884 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br><u>production process:</u><br>0↑1400 °F / slow cooling in furnace (indian red[107]): .10 g + .50 g of feldspar (dark reddish brown) / irradiated with gamma[239] rays at 64.7 Mrad<br>(followed at «reddish brown darker than "dark reddish brown"») |
| pinkish brown lighter than «dark pinkish brown» | 6885 | mineral : hypersthene<br>rock : black<br>powder : medium brownish grey<br>origin : Lac Saint-Jean, Québec<br><br><u>production process:</u><br>2 g of hypersthene + 2 g of sodium carbonate / 0↑1600 °F + 15 min. at 1600 °F (dark brown) / irradiated with gamma rays at 64.7 Mrad<br>(followed at «medium milky chocolate-brown [grey tone]») |

| | | |
|---|---|---|
| pinkish brown lighter and more pink than «light pinkish brown» | 6886 | mineral : smaltite[25], variety of skutterudite<br>rock : dark iron-grey, with silver metallic brilliance<br>powder : dark grey<br>origin : Cobalt, Ontario<br><br>production process:<br>(followed from «orange-brown darker than "dark orange-brown"»)<br>0↑1900 °F (dark brown) / irradiated with gamma[239] rays at 424.7 Mrad |
| dark pinkish brown | 6887 | mineral : quartz - mica[96]<br>powder : light cream (light yellow tone)<br>origin : small copper and nickel deposit, in the South-Western area of a mass of serpentinite, at 3 km at the West of Saint-Fabien-de-Panet, Québec<br><br>production process:<br>(followed from «brown [orange-pink tone]»)<br>0↑2200 °F<br>(followed at «medium chocolate-brown») |
| pinkish brown darker than «dark pinkish brown» | 6888 | mineral : rutile<br>powder : dark brown (orange-red reflection)<br>origin : North Stradbroke Island, Queensland, Australia<br><br>production process:<br>irradiated with gamma[239] rays at 65.704 Mrad<br><br>(followed at «reddish brown») |
| mixture of particles | | |
| pinkish brown / beige / very light grey | 6889 | mineral : asbestos[4]<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Québec<br><br>production process:<br>.50 g of asbestos + .50 g of zirconium silicate (very light grey) / irradiated with gamma rays at 614.204 Mrad[469] |

1299

| | | |
|---|---|---|
| pinkish brown / white | 6890 | mineral : spodumene<br>rock : pale green<br>powder : light grey, almost white<br>origin : Québec Lithium Co., Baraute, Abitibi, Québec<br><br>production process:<br>2 g of spodumene + 50 ml sulphuric acid / soaking: 2 wk. / drying on hot plate |
| medium pinkish brown / medium brownish grey / white | 6891 | mineral : jade<br>rock : dark red (orange tone)<br>powder : reddish orange<br>origin : China<br><br>production process:<br>(followed from «brown»)<br>2 g of jade + 2 g of sodium carbonate / 0↑1500 °F + 1 h at 1500 °F (brown) / irradiated with gamma rays at 424.7 Mrad |
| pinkish brown ranging from light to dark pinkish brown / light grey / white | 6892 | mineral : fuel oil soot[86]<br>powder : profound brownish black<br>origin : boiler room of Laval University, city of Québec, Québec<br><br>production process:<br>(followed from «mixture of particles: brown / orange»)<br>2 g of soot + 2 g of sodium carbonate / 0↑1300 °F + 1 h at 1300 °F (mixture of particles: brown / orange) / irradiated with gamma rays at 424.7 Mrad |
| brown (old rose tone) | | |
| pastel brown (old rose tone), lighter than «dark brown (old rose tone)» | 6893 | mineral : haematite<br>rock : medium chocolate-brown<br>powder : medium chocolate-brown<br>origin : Nouveau Québec, Québec<br><br>production process:<br>4 g of haematite + 80 ml hydrochloric acid / soaking: 2 wk. / drying on hot plate (dark chocolate-brown [pronounced orange tone]) / irradiated with gamma rays at 64.7 Mrad<br>(followed at «medium brown») |
| | | mineral : calcite<br>rock : light pink |

| | | |
|---|---|---|
| brown (old rose tone) | 6894 | powder : pinkish white<br>origin : Huddersfield district, Pontiac county, Québec<br><br>production process:<br>0↑1800 °F (medium brownish grey): 2 g + 80 ml nitric acid / soaking: 2 wk. / drying on hot plate |
| medium brown (old rose tone) | 6895 | mineral : crocidolite<br>rock : pale greyish blue<br>powder : pale greyish blue<br>origin : Griqualand district, South Africa<br><br>production process:<br>2 g of crocidolite + 2 g of sodium carbonate / 1400 °F / 1 h (light brown [orange tone]) / irradiated with gamma rays at 190.22 Mrad<br>(followed at «medium brown [orange-pink tone]») |
| medium brown (old rose tone) | 6896 | production process:<br>2 g of crocidolite + 2 g of sodium carbonate / 0↑1400 °F + 1 h at 1400 °F (light brown ochre [green reflection]) / irradiated with gamma rays at 190.22 Mrad<br>(followed at «medium brown [orange-pink tone]») |
| medium brown (accentuated old rose tone) [tending towards red]) | 6897 | mineral : haematite<br>rock : medium chocolate-brown<br>powder : medium chocolate-brown<br>origin : Nouveau Québec, Québec<br><br>production process:<br>4 g of haematite + 80 ml hydrochloric acid / soaking: 2 wk. / drying on hot plate (dark chocolate-brown [pronounced orange tone]) / irradiated with gamma rays at 424.7 Mrad |
| burnt umber[789a] (lilac-pink tone) | | |
| burnt umber (light lilac-pink tone) | 6898 | mineral : shale (formation of Sillery[347])<br>rock : dark violet-mars[753]<br>powder : light violet-mars[753]<br>origin : small copper and nickel deposit, in the South-Western area of a mass of serpentinite, at 3 km at the West of Saint-Fabien-de-Panet, Québec<br><br>production process:<br>0↑1400 °F / slow cooling in furnace |

| | | |
|---|---|---|
| [between «light and medium burnt umber (lilac-pink tone)» | | |
| pinkish brown (violet tone) | | |
| medium pinkish brown (violet reflection) | 6899 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : titanium dioxide<br>powder : white<br>origin : NL Chem Canada Inc., Québec<br><br><u>production process:</u><br>0↑1400 °F / slow cooling in furnace (indian red[107]): 1 g + 1.50 g of feldspar (medium brown [pinkish orange tone]): .50 g + .50 g of titanium dioxide / 1600 °F / 1 h |
| pinkish brown (light violet tone) a bit darker than «medium brown (light violet tone)» | 6900 | mineral : sandstone<br>rock : medium pinkish brown (light violet tone)<br>powder : medium pinkish brown (light violet tone)<br>origin : at the rear of Percé, Gaspésie, Québec<br><br><u>production process:</u><br>rock irradiated with electrons at 164,800 rad |
| | | mineral : goethite[106]<br>powder : rusty orange<br>origin : Red Mill, in the suburbs of Cap-de-la-Madeleine, Québec<br><br>mineral : feldspar<br>rock : white, opaque |

1302

| | | |
|---|---|---|
| | | powder : white<br>origin : Baraute, Abitibi, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process: |
| dark pinkish brown (violet tone) | 6901 | 0↑1400 °F / slow cooling in furnace (indian red[107]): 1.50 g + 1 g of feldspar (dark reddish brown): .50 g + .50 g of zirconium silicate + .50 g of sulphur / 1600 °F / 1 h<br>(followed at «greyish brown [violet-pink tone]») |
| pinkish brown (crimson tone) | | |
| | | mineral : apatite<br>rock : medium brownish red<br>powder : light pinkish beige<br>origin : Ile Calumet, Pontiac county, Québec<br><br>mineral : sulphur<br>rock : brilliant yellow<br>powder : brilliant yellow<br>origin : unknown<br><br>production process: |
| light pinkish brown (light crimson reflection) | 6902 | 2 g of apatite + 2 g of sulphur / 1300 °F / 1 h (medium pinkish beige) / irradiated with electrons at 302,831 rad[45] |
| orange-pink brown | | |
| | | mineral : fuel oil soot[84]<br>powder : profound brownish black<br>origin : boiler room of Laval University, city of Québec, Québec<br><br>production process: |
| orange-pink brown lighter than «light orange-pink brown» | 6903 | 2 g of soot + 2 g of sodium carbonate / 1200 °F / 1 h (light brown [orange-pink tone]) / irradiated with electrons at 162,431 rad<br>(followed at «medium brown [orange-pink tone]») |
| light orange-pink brown | 6904 | production process:<br>(followed from «brown»)<br>2 g of soot + 2 g of sodium carbonate / 1200 °F / 1 h |

1303

| | | |
|---|---|---|
| light orange-pink brown | 6905 | <u>production process:</u><br>(followed from «pinkish brown»)<br>2 g of soot + 2 g of sodium carbonate / 0↑1200 °F + 1 h at 1200 °F<br>(followed at «mixture of particles: brown / orange») |
| orange-pink brown darker and more pink than «light orange-pink brown» | 6906 | <u>production process:</u><br>2 g of soot + 2 g of sodium carbonate / 1200 °F / 1 h (light brown [orange-pink tone]) / irradiated with gamma rays at 64.7 Mrad<br>(followed at «medium pinkish brown») |
| brown (orange-pink tone or salmon tone) | 6907 | mineral : apatite<br>rock : reddish brown<br>powder : light pinkish beige<br>origin : Ile Calumet, Pontiac county, Québec<br><br><u>production process:</u><br>(followed from «pinkish brown»)<br>powder irradiated with gamma rays at 424.7 Mrad[791] |
| orange-pink brown | 6908 | mineral : quartz - mica[96]<br>powder : light cream (light yellow tone)<br>origin : small copper and nickel deposit, in the South-Western area of a mass of serpentinite, at 3 km at the West of Saint-Fabien-de-Panet, Québec<br><br><u>production process:</u><br>(followed from «dark pinkish salmon»)<br>0↑1850 °F<br>(followed at «dark pinkish brown») |
| medium orange-pink brown | 6909 | mineral : crocidolite<br>rock : pale greyish blue<br>powder : pale greyish blue<br>origin : Griqualand district, South Africa<br><br><u>production process:</u><br>(followed from «medium brown [old rose tone]»)<br>2 g of crocidolite + 2 g of sodium carbonate / 1400 °F / 1 h (light orange-brown) / irradiated with gamma rays at 650.22 Mrad |
| medium orange-pink brown | 6910 | <u>production process:</u><br>(followed from «medium brown [old rose tone]»)<br>2 g of crocidolite + 2 g of sodium carbonate / 0↑1400 °F + 1 h at 1400 °F (light brown ochre [green reflection]) / irradiated with gamma rays |

| | | |
|---|---|---|
| | | at 650.22 Mrad |
| medium brown (light orange reflection and accentuated pink tone) | 6911 | mineral : fuel oil soot[84]<br>powder : profound brownish black<br>origin : boiler room of Laval University, city of Québec, Québec<br><br><u>production process:</u><br>(followed from «brown [orange-pink tone] more light than "light brown [orange-pink tone]"»)<br>2 g of soot + 2 g of sodium carbonate / 1200 °F / 1 h (light brown [orange-pink tone]) / irradiated with electrons at 302,831 rad[45] |
| dark orange-pink brown | 6913 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br><u>production process:</u><br>(followed from «dark brown [orange-red tone]»)<br>0↑1400 °F / slow cooling in furnace (indian red[107]): .25 g + 1 g of feldspar<br>(followed at «dark reddish brown») |
| brown (lightened orange-pink tone) darker than «dark brown (orange-pink tone)» | 6914 | <u>production process:</u><br>(followed from «dark reddish brown»)<br>0↑1400 °F / slow cooling in furnace (indian red[107]): .25 g + 1 g of feldspar (dark brown [orange-pink tone]) / irradiated with gamma[239] rays at 424.7 Mrad |
| mixture of particles | | |
| pale brown (localized orange-pink tone) / pale grey | 6915 | mineral : almandite<br>rock : dark brownish red<br>powder : medium brownish red<br>origin : Gore Mountain, Warren county, New York state, United States<br><br><u>production process:</u><br>(followed from «brown [pinkish orange tone]»)<br>2 g of almandite + 2 g of sodium carbonate / 0↑1500 °F + 30 min. at 1500 °F (brown [tends towards olive-green]) / irradiated with gamma[239] |

1305

| | | |
|---|---|---|
| / white | | rays at 424.7 Mrad |
| pinkish brown (grey tone) | | |
| pale pinkish brown (localized grey reflection) | 6916 | mineral : sodalite<br>rock : cold light blue<br>powder : light grey (light blue tone)<br>origin : Bancroft, Ontario<br><br>production process:<br>2 g of sodalite + 2 g of sodium carbonate / 0↑1500 °F + 30 min. at 1500 °F (light beige) / irradiated with gamma rays at 64.7 Mrad<br>(followed at «mixture of particles: white / iron-grey / beige») |
| light brown (light pink and grey tones) | 6917 | mineral : apatite<br>rock : medium brownish red<br>powder : light pinkish beige<br>origin : Ile Calumet, Pontiac county, Québec<br><br>production process:<br>powder irradiated with electrons at 302,831 rad[36] |
| medium pinkish brown (grey tone) | 6918 | mineral : calcite<br>rock : light pink<br>powder : pinkish white<br>origin : Huddersfield district, Pontiac county, Québec<br><br>production process:<br>1000 °C / 1 h |
| pinkish brown (grey tone) much more intense than «medium pinkish brown (grey tone)» | 6919 | production process:<br>1000 °C / 1 h (medium pinkish brown [grey tone]) / powder irradiated with electrons at 302,831 rad[36] |
| pinkish brown (grey tone) much darker [brown] and intense than «medium pinkish brown (grey tone)» | 6920 | production process:<br>1000 °C / 1 h (medium pinkish brown [grey tone]) / powder irradiated with gamma rays at 122.984 Mrad[309]<br><br>(followed at «medium orange-beige») |

| | | |
|---|---|---|
| pinkish brown (grey tone) much darker than «medium brown (pink and grey tone)» | 6921 | <u>production process:</u><br>0↑2000 °F (medium brown-grey) / powder irradiated with electrons at 302,831 rad[36]<br><br>(followed at «medium orange-beige») |
| brown (pink and grey tones), [between «medium brown (pink and grey tones)» and «dark brown (pink and grey tones)»] | 6922 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br><u>production process:</u><br>(followed from «orange-brown [very light pink tone] a bit more pale than "medium pinkish orange-brown"»)<br><br>0↑1400 °F / slow cooling in furnace (indian red[107]): .10 g + 1.50 g of feldspar (medium brown [pinkish orange]) / irradiated with gamma[239] rays at 424.7 Mrad |
| reddish brown | | |
| reddish brown a bit lighter than «light reddish brown» | 6923 | mineral : goethite[106]<br>powder : rusty orange<br>origin : Red Mill, in the suburbs of Cap-de-la-Madeleine, Québec<br><br><u>production process:</u><br>0↑1400 °F / slow cooling in furnace (indian red[107]): 30 g + 100 ml hydrochloric acid / soaking: 1 wk. / drying on hot plate (dark red [light brown tone]): 2 g + 1 cc of white transparent printing ink / mechanical grinding / 1 impression on glazed white paper (light reddish brown) / irradiated with gamma rays at 5.7 Mrad[649] |
| | | mineral : ochre[98]<br>powder : yellow<br>origin : small copper and nickel deposit, in the South-Western area of a mass of serpentinite at 3 km at the West of Saint-Fabien-de-Panet, Québec |

| | | |
|---|---|---|
| reddish brown<br>darker than «light reddish brown»<br>↓<br>reddish brown<br>[more accentuated red tone] | 6924<br><br><br><br>6925 | <u>production process:</u><br>(followed from «light brown»)<br>0↑1000 °F[794]<br><br>0↑1300 °F<br><br>(followed at «rusty orange») |
| reddish brown | 6926 | mineral : actinolite<br>rock : cold and light evergreen<br>powder : light grey (light green tone)<br>origin : erratic block found at Saint-Philémon near Dorchester, Québec<br><br><u>production process:</u><br>3 g of actinolite + 50 ml hydrochloric acid / soaking: 2 wk. / separation of the liquid and the solid / drying on hot plate (colour of the solid: medium orange-brown) / irradiated with gamma rays at 70.4 Mrad<br>(followed at «dark chocolate-brown [light rusty orange reflection]») |
| reddish brown | 6927 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>5 g of asbestos + 100 ml sulphuric acid / soaking: 2 wk. / drying on hot plate (white, almost pure [slight yellow reflection]): .50 g + .50 g of sodium carbonate / 1800 °F / 1 h |
| reddish brown | 6928 | mineral : copper concentrate (Cu-FeS)<br>powder : medium chocolate-brown (grey tone)<br>origin : Centre de recherche des Mines Noranda in Montréal, Québec<br><br><u>production process:</u><br>4 g of concentrate + 50 ml hydrochloric acid / soaking: 4 wk. / drying on hot plate |
| | | mineral : corundum<br>rock : rusty yellow<br>powder : light grey<br>origin : Mount Eagle, Ontario |

| | | |
|---|---|---|
| reddish brown | 6929 | mineral : sulphur<br>rock : brilliant yellow<br>powder : brilliant yellow<br>origin : unknown<br><br>production process:<br>2 g of corundum + 25 ml nitric acid / soaking: 24 h / drying on hot plate |
| reddish brown | 6930 | mineral : corundum<br>rock : medium grey<br>powder : light grey<br>origin : Transvaal, Africa<br><br>production process:<br>2 g of corundum + 2 g of sulphur / 1300 °F / 1 h (pale red-beige) / irradiated with gamma rays at 64.7 Mrad<br>(followed at «medium milky chocolate-brown [pinkish orange tone]») |
| reddish brown | 6931 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>0†1400 °F / slow cooling in furnace (indian red[107]): 1 g + .50 g of feldspar (dark brownish red) / irradiated with gamma[239] rays at 64.7 Mrad (followed at «reddish brown darker than "dark reddish brown"») |
| reddish brown | 6932 | production process:<br>1 g of goethite + 1 g of feldspar / grinding |
| reddish brown | 6933 | mineral : goethite[106]<br>powder : rusty orange<br>origin : Red Mill, in the suburbs of Cap-de-la-Madeleine, Québec<br><br>production process:<br>400 °F / 1 h |
| reddish brown [different than the previous one] | 6934 | 500 °F / 1 h |

| | | |
|---|---|---|
| ↓<br>reddish brown | 6935 | 600 °F / 1 h[795]<br>(followed at «dark rusty orange [red tone]») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u> |
| brown (light red tone) | 6936 | 2 g of goethite + 2 g of sulphur / 400 °F / 1 h<br><br>(followed at «medium brown»)<br><br>(followed from «light chocolate-brown») |
| brown (light red tone) [different from the previous one] | 6937 | 2 g of goethite + 2 g of sulphur / 500 °F / 1 h<br><br>(followed at «chocolate-brown» and «brown [light orange tone]»)<br><br>(followed from «chocolate-brown lighter than "medium chocolate-brown"» and «brown [light violet tone]») |
| ↓<br>brown (light red tone) [different from the 2 previous ones] | 6938 | 2 g of goethite + 2 g of sulphur / 1300 °F / 1 h<br><br>(followed at «dark chocolate-brown») |
| | | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br><u>production process:</u><br>(followed from «brownish red») |
| reddish brown | 6939 | .50 g of goethite + .50 g of zirconium silicate (whitened rusty orange) / 0↑1800 °F[796]<br>(followed at «dark caput-mortuum [accentuated violet tone]») |

1310

| | | |
|---|---|---|
| | | (followed from «brownish red lighter than "brownish red"») |
| reddish brown lighter than «reddish brown» | 6940 | .50 g of goethite + 1 g of zirconium silicate / 0↑1800 °F<br>(followed at «dark caput-mortuum [violet tone]»)<br>(followed from «brownish red still more light than "brownish red"») |
| ↓<br>reddish brown more pale and whitened | 6941 | .50 g of goethite + 1.50 g of zirconium silicate / 0↑1800 °F<br>(followed at «caput-mortuum [grey tone and violet reflection]») |
| reddish brown | 6942 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>mineral : feldspar<br>rock : white, opaque<br>powder : white<br>origin : Baraute, Abitibi, Québec<br><br><u>production process:</u><br>(followed from «rusty brown»)<br>0↑1400 °F / slow cooling in furnace (indian red[107]): 1 g + 1 g of feldspar (dark reddish brown [tends towards Burgundy red]): .50 g + .50 g of sodium carbonate + .50 g of zirconium silicate / 1700 °F / 1 h (light green) / irradiated with gamma rays at 425.65 Mrad |
| reddish brown | 6943 | mineral : goethite[106]<br>powder : rusty orange<br>origin : Red Mill, in the suburbs of Cap-de-la-Madeleine, Québec<br><br>mineral : zirconium oxide<br>powder : light beige<br>origin : Tam Ceramic Inc., Québec<br><br><u>production process:</u><br>(followed from «brown [violet-red tone]»)<br>1 g of goethite + .50 g of zirconium oxide / 0↑1900 °F[797] |

1311

| | | |
|---|---|---|
| | | (followed at «dark violet-brown») |
| | | (followed from «brown [violet-red tone]» and «dark violet-brown [red tone]») |
| reddish brown | 6944 | 1 g of goethite + 1 g of zirconium oxide / 0↑1900 °F[798] |
| | | (followed at «dark violet-brown») |
| | | (followed from «brown [violet-red tone]») |
| ↓ | | |
| reddish brown | 6945 | 1 g of goethite + 1.50 g of zirconium oxide / 0↑1900 °F[799] (followed at «dark violet-brown») |
| | | mineral : almandite<br>rock : dark brownish red<br>powder : medium brownish red<br>origin : Gore Mountain, Warren county, New York state, United States |
| | | production process:<br>(followed from «brownish red») |
| brown (light red tone) | 6946 | powder irradiated with gamma rays at 360 Mrad<br>(followed at «medium pinkish brown») |
| | | mineral : halite[41]<br>rock : colourless<br>powder : colourless<br>origin : Seleine Mine, Iles-de-la-Madeleine, Québec |
| | | production process:<br>(followed from «grey-brown»)<br>rock irradiated with gamma rays at: |
| reddish brown | 6947 | 200 Mrad |
| reddish brown | 6948 | 201.6 Mrad[133] |
| ↓ | | |
| reddish brown | 6949 | 205 Mrad<br>(followed at «dark chocolate-brown») |
| | | production process:<br>(followed from «grey-brown»)<br>powder[800] filtered at 14 meshes and irradiated with gamma rays at: |
| reddish brown | 6950 | 195.02 Mrad |
| ↓ | | |
| reddish brown | 6951 | 238.6 Mrad<br>(followed at «dark chocolate-brown») |

1312

| | | |
|---|---|---|
| | | production process:<br>(followed from «grey-brown»)<br>powder[800] filtered at 42 meshes and irradiated with gamma rays at: |
| reddish brown | 6952 | 195.02 Mrad |
| ↓ | | |
| reddish brown | 6953 | 238.6 Mrad<br>(followed at «dark chocolate-brown») |
| reddish brown | 6954 | mineral : haematite<br>rock : dark brown (light red tone)<br>powder : dark brown (light red tone)<br>origin : Shefferville, Ungava, Québec<br><br>production process:<br>1300 °F / 1 h<br>(followed at «brownish red») |
| reddish brown | 6955 | production process:<br>1400 °F / 1 h (brownish red) / powder irradiated with gamma[239] rays at 64.7 Mrad<br>(followed at «dark reddish brown») |
| | | mineral : haematite<br>rock : medium chocolate-brown<br>powder : medium chocolate-brown<br>origin : Nouveau Québec, Québec<br><br>production process: |
| reddish brown | 6956 | 500 °F / 1 h |
| \| | | |
| reddish brown lighter than «reddish brown» | 6957 | 600 °F / 1 h |
| \| | | |
| reddish brown identical to the previous one | 6958 | 700 °F / 1 h |
| \| | | |
| reddish brown identical to the previous one | 6959 | 800 °F / 1 h |
| \| | | |
| reddish brown identical to the previous one | 6960 | 900 °F / 1 h |
| \| | | |
| reddish brown identical to the previous one | 6961 | 1000 °F / 1 h |
| \| | | |
| reddish brown identical to the | 6962 | 1100 °F / 1 h |

1313

| | | |
|---|---|---|
| previous one | | |
| ↓ | | |
| darker reddish brown | 6963 | 1200 °F / 1 h |
| ↓ | | |
| reddish brown | 6964 | 1300 °F / 1 h |
| ↓ which | 6965 | 1400 °F / 1 h |
| ↓ darkens | 6966 | 1500 °F / 1 h |
| progressively | | |
| ↓ but | 6967 | 1600 °F / 1 h |
| very slightly at | 6968 | 1700 °F / 1 h |
| each step | | (followed at «medium chocolate-brown») |
| reddish brown | 6969 | mineral : ilmenite<br>rock : blackish grey, with metallic luster<br>powder : blackish grey, with metallic luster<br>origin : Québec Fer et Titane Co., Havre Saint-Pierre, Québec<br><br>mineral : sulphur<br>rock : brilliant yellow<br>powder : brilliant yellow<br>origin : unknown<br><br>production process:<br>2 g of ilmenite + 2 g of sulphur / 1300 °F / 1 h |
| reddish brown | 6970 | mineral : jade<br>rock : dark red (orange tone)<br>powder : orange (red tone)<br>origin : China<br><br>production process:<br>3 g of jade + 25 ml sulphuric acid / soaking: 24 h / drying on hot plate |
| reddish brown | 6971 | mineral : ochre[98]<br>powder : yellow<br>origin : small copper and nickel deposit, in the South-Western area of a mass of serpentinite at 3 km at the West of Saint-Fabien-de-Panet, Québec<br><br>mineral : nickel<br>powder : dark brownish grey, with metallic brilliance<br><br>production process:<br>1 g of ochre + 1 g of nickel / 2000 °F / 45 min. |
| | | mineral : ochre[20]<br>powder : orange |

1314

| | | |
|---|---|---|
| reddish brown | 6972 | origin : small copper and nickel deposit, in the Southern-Western area of a mass of serpentinite, at 3 km at the West of Saint-Fabien-de-Panet, Québec<br><br><u>production process:</u><br>(followed from «orange-brown»)<br>0↑2000 °F |
| reddish brown | 6973 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br><u>production process:</u><br>(followed from «brownish red»)<br>1 g of ochre + 2 g of halite / 0↑1300 °F<br>(followed at «greyish brown [crimson tone]») |
| reddish brown | 6974 | mineral : pentlandite[102]<br>rock : dark iron-grey, with a silver and golden yellow metallic brilliance<br>powder : dark iron-grey (pronounced brown tone)<br>origin : Inco Co., Sudbury, Ontario<br><br><u>production process:</u><br>2 g of pentlandite + 2 g of sodium carbonate / 700 °F / 1 h |
| reddish brown | 6975 | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br><u>production process:</u><br>4 g of pyrrhotite + 20 ml hydrochloric acid / soaking: 3 d. / drying on hot plate (medium orange-brown) / irradiated with electrons at 162,431 rad |
| | | mineral : rutile<br>powder : dark brown (orange-red reflection)<br>origin : North Stradbroke, Queensland, Australia |

| | | |
|---|---|---|
| reddish brown | 6976 | production process:<br>(followed from «pinkish brown»)<br>irradiated with gamma[239] rays at 244.53 Mrad<br>(followed at «dark reddish brown») |
| reddish brown | 6977 | mineral : smaltite[25], variety of skutterudite<br>rock : dark iron-grey, with a silver metallic brilliance<br>powder : dark grey<br>origin : Cobalt, Ontario<br><br>production process:<br>0↑1900 °F (dark brown): .30 g + 50 ml nitric acid / soaking: 2 wk. / drying on hot plate |
| reddish brown / blackish brown | 6978 | mineral : zincite<br>rock : mixture of areas: dark grey / orange-red<br>powder : medium milky chocolate-brown (red tone)<br>origin : Franklin, New Jersey, United States<br><br>production process:<br>(followed from «the rock has 2 areas: orange-red darker than "orange-red" / grey darker than "dark grey"»)<br>rock irradiated with gamma rays at 482.984 Mrad[228,509,801] / colour of the 2 areas of the rock |
| reddish brown very, very slightly darker than «reddish brown» | 6979 | mineral : zinc concentrate grilled at 1000 °C ($ZnO-FeO)(SO_4$)<br>powder : reddish brown<br>origin : Zinc Electrolytic du Canada Co., Québec<br><br>production process:<br>irradiated with gamma[239] rays at:<br>64.7 Mrad |
| ↓<br>reddish brown a bit darker and more red | 6980 | 424.7 Mrad[802] |
| | | mineral : copper<br>rock : reddish brown, with metallic luster<br>powder : reddish brown, with metallic luster<br>origin : unknown |

1316

| | | |
|---|---|---|
| | | production process: |
| | | powder irradiated with gamma[239] rays at: |
| reddish brown a bit darker, more brown and more red than «reddish brown» | 6981 | 64.7 Mrad |
| ↓ | | |
| reddish brown still slightly darker, more brown and more red | 6982 | 424.7 Mrad |
| | | mineral : pyrochlore<br>powder : reddish brown<br>origin : De-Mix quarry, North side of Mont Saint-Hilaire, Rouville county, Québec |
| | | production process: |
| reddish brown darker than «reddish brown» | 6983 | irradiated with gamma[239] rays at 64.7 Mrad[803] (followed at «dark chocolate-brown») |
| | | mineral : pyrrhotite[276]<br>rock : dark greyish brown, with golden yellow metallic brilliance<br>powder : dark grey<br>origin : Inco Co., Sudbury, Ontario |
| | | production process: |
| | | rock irradiated with gamma rays at: |
| reddish brown darker than «reddish brown» | 6984 | 122.984 Mrad |
| ↓ | | |
| darker reddish brown | 6985 | 148.4 Mrad[804] |
| ↓ | | |
| still darker reddish brown | 6986 | 201.6 Mrad |
| ↓ | | |
| still darker reddish brown | 6987 | 247.6 Mrad[805] (followed at «dark chocolate-brown») |
| | | mineral : smaltite[25], variety of skutterudite<br>rock : dark iron-grey, with a silver metallic brilliance<br>powder : dark grey<br>origin : Cobalt, Ontario |
| | | production process: |
| reddish brown | 6988 | 0↑1900 °F (dark brown): .30 g + 50 ml nitric acid |

1317

| | | |
|---|---|---|
| darker and more red than «reddish brown» | | / soaking: 2 wk. / drying on hot plate (reddish brown) / irradiated with gamma rays at 64.7 Mrad (followed at «mixture of particles: grass-green / pinkish lilac») |
| medium reddish brown | 6989 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>(followed from «black»)<br>50 g of asbestos + 200 ml hydrochloric acid or asbestos entirely covered with hydrochloric acid / soaking: 1 wk. / drying on hot plate (vivid yellow): 1 g + 1 g of sodium carbonate + 3 g of sulphur / 1700 °F / 1 h<br>(followed at «medium milky chocolate-brown [grey tone]») |
| medium reddish brown | 6990 | mineral : bornite<br>rock : reddish brown (with localized green and bluish green oxidation)<br>powder : reddish brown<br>origin : Lac Musset, Fosse du Labrador, Québec<br><br>production process:<br>1500 °F / 1 h |
| medium reddish brown | 6991 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : zirconium silicate<br>powder : white (very light yellow reflection)<br>origin : Sial Company, Québec<br><br>production process:<br>0†1400 °F / slow cooling in furnace (indian red[107]): 1 g + 1.50 g of feldspar (medium brown [pinkish orange tone]): .50 g + .50 g of zirconium |

| | | |
|---|---|---|
| | | silicate / 1600 °F / 1 h<br>(followed at «dark reddish brown») |
| medium reddish brown | 6992 | mineral : almandite<br>rock : dark browish red<br>powder : medium brownish red<br>origin : Gore Mountain, Warren county, state of New York, United States<br><br>production process:<br>1400 °F / 1 h |
| medium reddish brown | 6993 | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br>production process:<br>(followed from «dark chocolate-brown [light red tone]»)<br>2 g of haematite + 2 g of sulphur / 900 °F / 1 h<br>(followed at «medium brown») |
| medium reddish brown ↓ | 6994 | mineral : magnetite<br>rock : dark grey, with metallic brilliance<br>powder : dark grey<br>origin : Fosse du Labrador, Québec<br><br>mineral : sulphur<br>rock : brilliant yellow<br>powder : brilliant yellow<br>origin : unknown<br><br>production process:<br>2 g of magnetite + 2 g of sulphur / 1300 °F / 1 h |
| reddish brown darker than «medium reddish brown» | 6994.1 | 2 g of magnetite + 2 g of sulphur / 1500 °F / 1 h |
| | | mineral : almandite<br>rock : dark browish red<br>powder : medium brownish red<br>origin : Gore Mountain, Warren county, state of New York, United States |

1319

| | | |
|---|---|---|
| reddish brown a bit darker [brown] than «medium reddish brown» | 6995 | production process:<br>1400 °F / 1 h (medium reddish brown) / powder irradiated with gamma[239] rays at 64.7 Mrad<br>(followed at «reddish brown [between "medium reddish brown" and "dark reddish brown"]») |
| | | mineral : ochre[128]<br>powder : black<br>origin : Red Mill, in the suburbs of Cap-de-la-Madeleine, Québec<br><br>production process:<br>(followed from «brown [orange-red tone] a bit darker than "medium brown [orange-red tone]"») |
| reddish brown a bit darker than «reddish brown darker than "medium reddish brown"» | 6996 | 0↑1600 °F<br><br>(followed at «dark and intense brown [accentuated violet-red tone]») |
| | | mineral : haematite<br>rock : medium chocolate-brown<br>powder : medium chocolate-brown<br>origin : Nouveau Québec, Québec<br><br>production process: |
| brown (light red red) darker than «medium reddish brown» | 6997 | 0↑ 500 °F |
| ↓ | | |
| reddish brown | 6998 | 0↑ 600 °F |
| ↓ | | |
| reddish brown | 6999 | 0↑ 700 °F |
| ↓ | | |
| reddish brown a bit darker | 7000 | 0↑ 800 °F |
| ↓ | | |
| reddish brown still a bit darker | 7001 | 0↑ 900 °F |
| ↓ | | |
| reddish brown still a bit darker | 7002 | 0↑1100 °F |
| ↓ | | |
| reddish brown still a bit darker | 7003 | 0↑1300 °F<br>(followed at «dark violet-brown») |
| | | mineral : haematite<br>rock : medium chocolate-brown<br>powder : medium chocolate-brown<br>origin : Nouveau Québec, Québec |

1320

| | | |
|---|---|---|
| reddish brown darker than «medium reddish brown» | 7004 | mineral : sulphur<br>rock : brilliant yellow<br>powder : brilliant yellow<br>origin : unknown<br><br>production process:<br>(followed from «brown darker than "medium brown"»)<br>2 g of haematite + 2 g of sulphur / 1300 °F / 1 h<br>(followed at «brown still darker than "medium reddish brown"») |
| darker reddish brown [more brown] and less red than «medium reddish brown» | 7005 | production process:<br>2 g of haematite + 2 g of sulphur / 1300 °F / 1 h (reddish brown darker than «medium reddish brown») / irradiated with gamma[239] rays at 424.7 Mrad[81] |
| reddish brown darker than «medium reddish | 7006 | mineral : olivine<br>rock : light grey, cr stalline<br>powder : very light grey<br>origin : Mont Albert, Gaspésie, Québec<br><br>production process:<br>(followed from «orange much more intense than "medium rusty orange"»)<br>4 g of olivine + 50 ml nitric acid / soaking: 2 wk. / drying on hot plate (medium rusty orange) / irradiated with gamma rays at 424.7 Mrad |
| reddish brown much darker than «medium reddish brown» | 7007 | mineral : zincite<br>rock : mixture of areas: dark grey / orange-red<br>powder : medium milky chocolate-brown (red tone)<br>origin : Franklin, New Jersey, United States<br><br>production process:<br>4 g of zincite + 80 ml hydrochloric acid / soaking: 2 wk. / drying on hot plate (medium reddish orange) / irradiated with gamma[239] rays at:<br>64.7 Mrad |
| ↓ | | |
| reddish brown much darker than «medium reddish brown» | 7008 | 424.7 Mrad |

| | | |
|---|---|---|
| reddish brown still darker [more brown], between «medium reddish brown» and «dark reddish brown» | 7009 | mineral : almandite<br>rock : dark brownish red<br>powder : medium brownish red<br>origin : Gore Mountain, Warren county, state of New York, United States<br><br>production process:<br>(followed from «reddish brown darker than "medium reddish brown"»)<br>1400 °F / 1 h (medium reddish brown) / powder irradiated with gamma[239] rays at 424.7 Mrad |
| reddish brown [between «medium reddish brown» and «dark reddish brown»] | 7010 | mineral : ochre[111]<br>powder : dark reddish brown<br>origin : Red Mill, in the suburbs of Cap-de-la-Madeleine, Québec<br><br>mineral : table salt (NaCl)<br>powder : colourless<br>origin : Sifto Company<br><br>production process:<br>(followed from «orange-red a bit darker than "vivid orange-red"»)<br>10 g of ochre + 10 g of NaCl / 0↑1500 °F<br><br>(followed at «brown [violet-red tone]») |
| reddish brown more pale than «dark reddish brown» | 7011 | mineral : goethite[106]<br>powder : rusty orange<br>origin : Red Mill, in the suburbs of Cap-de-la-Madeleine, Québec<br><br>mineral : zirconium oxide<br>powder : light beige<br>origin : Tam Ceramic Inc., Québec<br>production process:<br>1 g of goethite + 1 g of zirconium oxide / 0↑1900 °F (reddish brown) / irradiated with gamma[228] rays at 65.65 Mrad<br>(followed at «brown [orange-red tone] a bit less dark than "dark brown [orange-red tone]"») |
| | | mineral : goethite[106]<br>powder : rusty orange<br>origin : Red Mill, in the suburbs of Cap-de-la-Madeleine, Québec |

| | | |
|---|---|---|
| reddish brown a bit more pale than «dark reddish brown» | 7012 | mineral : sulphur<br>rock : brilliant yellow<br>powder : brilliant yellow<br>origin : unknown<br><br>production process:<br>0↑1400 °F / slow cooling in furnace (indian red[107]): 8 g + 96 g of sulphur / 1500 °F / 1 h (dark violet-brown): .50 g + .50 g of sodium carbonate (dark reddish brown) / irradiated with gamma[239] rays at 482.984 Mrad[505] |
| reddish brown a bit more pale and less orange than «dark reddish brown» | 7013 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>0↑1400 °F / slow cooling in furnace (indian red[107]): .25 g + 1.50 g of feldspar (dark reddish brown) / irradiated with gamma[239] rays at 64.7 Mrad<br>(followed at «reddish brown darker than "dark reddish brown"») |
| reddish brown a | 7014 | mineral : ocre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «pinkish grey-brown [slightly less dark than "dark pinkish grey-brown"»)<br>1 g of ochre + 1 g of sulphur + 1 g of zirconium silicate:<br>0↑1500 °F |

1323

| | | |
|---|---|---|
| bit less dark than | | |
| «reddish brown | | |
| slightly less dark | | |
| than "dark | | |
| reddish brown"» | | |
| ↓ | | |
| reddish brown | 7015 | 0↑1600 °F |
| still more red | | |
| and a bit less | | |
| red ↓ | | |
| reddish brown | 7016 | 0↑1700 °F |
| still more red | | |
| and a bit less | | |
| dark | | |
| | | mineral : goethite[106] |
| | | powder : rusty orange |
| | | origin : Red Mill, in the suburbs of Cap-de-la |
| | | -Madeleine, Québec |
| | | |
| | | mineral : feldspar |
| | | rock : white, opaque |
| | | powder : white |
| | | origin : Baraute, Abitibi, Québec |
| | | |
| | | <u>production process:</u> |
| | | (followed from «brownish red slightly lighter than |
| | | "dark brownish red"») |
| reddish brown | 7017 | 0↑1400 °F / slow cooling in furnace (indian |
| lighter, more red | | red[107]): 1.50 g + .50 g of feldspar (dark reddish |
| and more luminous | | brown) / irradiated with gamma rays at 424.7 Mrad |
| than «dark | | |
| reddish brown» | | |
| | | mineral : agate |
| | | rock : grey (with a light orange circular |
| | | area on the surface), slightly |
| | | translucid |
| | | powder : very light grey |
| | | origin : unknown |
| | | |
| | | <u>production process:</u> |
| | | (followed from «orange-brown») |
| | | the «light orange» circular area of the rock is |
| | | irradiated with gamma rays at: |
| dark reddish brown | 7018 | 247.6 Mrad |
| dark reddish brown | 7019 | 287.3 Mrad |
| ↓ | | |
| still darker | 7020 | 360 Mrad |
| reddish brown | | |
| ↓ | | |
| still darker | 7021 | 424.7 Mrad |

1324

| | | |
|---|---|---|
| reddish brown | | |
| dark brown (light reddish tone) | 7022 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>1 g of asbestos + 2 g of sodium carbonate + 1 g of sulphur / 0↑1700 °F |
| dark reddish brown | 7023 | production process:<br>(followed from «beige-grey»)<br>.50 g of asbestos + .50 g of sodium carbonate + .50 g of sulphur / 1700 °F / 1 h |
| dark brown (light red tone) | 7024 | mineral : chromite<br>rock : blackish grey<br>powder : medium brownish grey<br>origin : Black Lake, near Thetford Mines, Québec<br><br>production process:<br>4 g of chromite + 80 ml nitric acid / soaking: 2 wk. / drying on hot plate |
| dark reddish brown | 7025 | mineral : zinc concentrate grilled at 1000 °C $(ZnO-FeO)(SO_4)$<br>powder : reddish brown<br>origin : Zinc Electrolytic du Canada Co., Québec<br><br>production process:<br>2 g of concentrate + 2 g of sodium carbonate / 0↑1600 °F + 1 h at 1600 °F (dark rusty brown) / irradiated with gamma$^{239}$ rays at 64.7 Mrad (followed at «mixture of particles: reddish brown / white») |
| | | mineral : solid epidote<br>rock : brownish green<br>powder : brownish green<br>origin : James Bay, Québec<br><br>mineral : sulphur<br>rock : brilliant yellow<br>powder : brilliant yellow<br>origin : unknown |

| | | |
|---|---|---|
| dark reddish brown | 7026 | production process:<br>1 g of solid epidote + 1 g of sulphur / 1600 °F / 1 h |
| dark reddish brown | 7027 | mineral : solid epidote<br>rock : brownish green<br>powder : brownish green<br>origin : James Bay, Québec<br><br>production process:<br>(followed from «orange-beige darker than "medium beige [light orange tone]"»)<br>0↑1700 °F |
| dark reddish brown, mat | 7028 | mineral : biotite gneiss<br>rock : blackish grey, golden vitreous brilliance<br>powder : dark grey<br>origin : Grenville geological province, Québec<br><br>production process:<br>12 g of gneiss + 40 ml nitric acid / soaking: 22 d. / drying on hot plate (vivid and dark reddish orange): .50 g + .50 g of sodium carbonate / 0↑1700 °F |
| dark reddish brown | 7029 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>0↑1400 °F / slow cooling in furnace (indian red[107]): .25 g + 1 g of feldspar (dark brown [orange-pink tone]) / irradiated with gamma[239] rays at 64.7 Mrad<br>(followed at «brown [orange-pink tone] darker than "dark brown [orange-pink tone]"») |
| dark reddish brown | 7030 | production process:<br>0↑1400 °F / slow cooling in furnace (indian red[107]): .10 g + .50 g of feldspar<br><br>(followed at «medium brown [orange-red tone]»)<br><br>(followed from «dark brown [orange-pink tone]») |

| | | |
|---|---|---|
| dark reddish brown | 7031 | 0↑1400 °F / slow cooling in furnace (indian red[107]): .25 g + 1.50 g of feldspar<br><br>(followed at «dark brownish red»)<br><br>(followed from «dark brownish red») |
| dark reddish brown | 7032 | 0↑1400 °F / slow cooling in furnace (indian red[107]): .50 g + 1 g of feldspar |
| dark reddish brown | 7033 | 0↑1400 °F / slow cooling in furnace (indian red[107]): .50 g + 1.50 g of feldspar<br><br>(followed at «dark brownish red»)<br><br>(followed from «dark brownish red») |
| dark reddish brown [tends towards Burgundy-red] | 7034 | 0↑1400 °F / slow cooling in furnace (indian red[107]): 1 g + 1 g of feldspar<br><br>(followed at «medium brown [pinkish orange tone]»)<br><br>(followed from «medium brown [pinkish orange tone») |
| dark reddish brown | 7035 | 0↑1400 °F / slow cooling in furnace (indian red[107]): 1.50 g + .50 g of feldspar |
| dark reddish brown | 7036 | 0↑1400 °F / slow cooling in furnace (indian red[107]): 1.50 g + 1 g of feldspar |
| dark reddish brown | 7037 | 0↑1400 °F / slow cooling in furnace (indian red[107]): 1.50 g + 1.50 g of feldspar |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : zirconium silicate<br>powder : white (very light yellow reflection)<br>origin : Sial Company, Québec<br><br>production process:<br>(followed from «medium reddish brown») |
| dark reddish brown | 7038 | 0↑1400 °F / slow cooling in furnace (indian red[107]): 1 g + 1.50 g of feldspar (medium brown [pinkish orange tone]): .50 g + .50 g of zirconium silicate / 1700 °F / 1 h |

| | | |
|---|---|---|
| dark reddish brown | 7039 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>production process:<br>0↑1400 °F / slow cooling in furnace (indian red[107]): 1.50 g + 1.50 g of feldspar (dark reddish brown): .50 g + .50 g of sulphur / 1600 °F / 1 h |
| dark reddish brown | 7040 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>8 g of goethite + 96 g of sulphur / 1500 °F / 1 h |
| dark reddish brown | 7041 | production process:<br>0↑1400 °F / slow cooling in furnace (indian red[107]): 8 g + 96 g of sulphur / 1500 °F / 1 h (dark violet-brown): .50 g + .50 g of sodium carbonate |
| dark reddish brown | 7042 | production process:<br>0↑1400 °F / slow cooling in furnace (indian red[107]): 8 g + 96 g of sulphur / 1500 °F / 1 h (dark violet-brown): .50 g + .50 g of sulphur |
| | | mineral : almandite<br>rock : dark browish red<br>powder : medium brownish red<br>origin : Gore Mountain, Warren county, state of New York, United States |

| | | |
|---|---|---|
| dark reddish brown [red tone is less orange] | 7043 | mineral : sulphur<br>rock : brilliant yellow<br>powder : brilliant yellow<br>origin : unknown<br><br>production process:<br>2 g of almandite + 2 g of sulphur / 1300 °F / 1 h (medium brown [orange-red tone]) / irradiated with gamma rays at 424.7 Mrad |
| dark reddish brown | 7044 | mineral : haematite<br>rock : dark brown (light red tone)<br>powder : dark brown (light red tone)<br>origin : Shefferville, Ungava, Québec<br><br>production process:<br>(followed from «reddish brown»)<br>1400 °F / 1 h (brownish red) / powder irradiated with gamma$^{239}$ rays at 424.7 Mrad |
| dark reddish brown | 7045 | mineral : haematite<br>rock : medium chocolate-brown<br>powder : medium chocolate-brown<br>origin : Nouveau Québec, Québec<br><br>production process:<br>0↑1800 °F (dark violet-brown): 4 g + 80 ml hydrochloric acid / soaking: 2 wk. / drying on hot plate (dark brown [light rusty tone]) / irradiated with gamma rays at 64.7 Mrad<br>(followed at «orange-brown») |
| dark brown (light red tone) | 7046 | mineral : jade<br>rock : dark red (orange tone)<br>powder : orange (red tone)<br>origin : China<br><br>production process:<br>0↑2000 °F |
| dark brown (light red tone) | 7046.1 | mineral : jade<br>rock : dark red (orange tone)<br>powder : orange (red tone)<br>origin : China<br><br>mineral : nickel<br>powder : dark brownish grey, with metallic brilliance<br><br>production process:<br>1 g of jade + 1 g of nickel / 2000 °F / 45 min. |

| | | |
|---|---|---|
| dark reddish brown | 7047 | mineral : magnetite<br>rock : dark grey, with metallic brilliance<br>powder : dark grey<br>origin : Fosse du Labrador, Québec<br><br>production process:<br>2 g of magnetite + 2 g of sodium carbonate / 1100 °F / 1 h |
| dark reddish brown | 7048 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>2 g of molybdenite + 2 g of sodium carbonate / 0↑1900 °F + 1 h at 1900 °F (azure-blue more intense than «light azure-blue») / irradiated with gamma[239] rays at 424.7 Mrad[81] |
| dark reddish brown | 7049 | mineral : ochre[98]<br>powder : yellow<br>origin : small copper and nickel deposit, in the South-Western area of a mass of serpentinite at 3 km at the West of Saint-Fabien-de-Panet, Québec<br><br>mineral : chrome<br>powder : light grey, with metallic brilliance<br><br>production process:<br>1 g of ochre + 1 g of chrome / 2000 °F / 45 min.[806] |
| dark reddish brown | 7050 | mineral : ochre[111]<br>powder : dark reddish brown<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «dark chocolate-brown [light pink tone]»)<br>1 g of ochre + 1 g of zirconium silicate / 0↑1300 °F<br>(followed at «dark brownish red») |
| | | mineral : ochre[111]<br>powder : dark reddish brown<br>origin : Red Mill, in the suburbs of Cap-de-la-Madeleine, Québec |

1330

| | | |
|---|---|---|
| dark reddish brown | 7051 | production process:<br>(followed from «blackish brown»)<br>0↑1500 °F<br>(followed at «dark brownish red») |
| dark reddish brown<br>↓<br>reddish brown<br>still darker | 7052<br><br>7053 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «fairly vivid Burgundy red»)<br>1 g of ochre + 1 g of halite:<br>0↑1300 °F<br><br>0↑1500 °F<br>(followed at «dark brown [violet-red tone]») |
| dark reddish brown<br>\|<br>dark reddish brown<br>still more red<br>↓<br>dark reddish brown<br>still more red | 7054<br><br>7055<br><br><br>7056 | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «dark chocolate-brown»)<br>1 g of ochre + 1 g of sulphur:<br>0↑1300 °F<br><br>0↑1500 °F<br><br><br>0↑1600 °F<br>(followed at «dark reddish brown [light violet tone]») |
| | | mineral : ochre[128]<br>powder : black<br>origin : Red Mill, in the suburbs of Cap-de-la-Madeleine, Québec |

| | | |
|---|---|---|
| dark reddish brown | 7057 | mineral : table salt (NaCl)<br>powder : colourless<br>origin : Sifto Company<br><br>production process:<br>(followed from «brown [reddish orange tone]»)<br>10 g of ochre + 10 g of NaCl / 0↑1500 °F<br>(followed at «light brown [violet-red tone]») |
| dark and vivid reddish brown<br>↓<br>reddish brown more red | 7058<br><br><br>7059 | mineral : ochre[128]<br>powder : black<br>origin : Red Mill, in the suburbs of Cap-de-la -Madeleine, Québec<br><br>mineral : halite[41]<br>rock : colourless<br>powder : colourless<br>origin : Seleine Mine, Iles-de-la-Madeleine, Québec<br><br>production process:<br>1 g of ochre + 2 g of halite:<br>0↑1000 °F<br><br>0↑1300 °F<br>(followed at «brown [violet-red tone] a bit darker than "dark brown [violet-red tone]"») |
| dark brown (light red tone) | 7060 | mineral : uraninite<br>rock : medium chocolate-brown (red Bordeau tone)<br>powder : medium milky chocolate-brown<br>origin : Yellowknife, Canada<br><br>production process:<br>8 g of uraninite + 100 ml nitric acid / soaking: 2 wk. / drying on hot plate |
| dark reddish brown<br>\|<br>reddish brown a bit lighter<br>\| | 7061<br><br>7062 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>2 g of pentlandite + 2 g of sodium carbonate:<br>700 °F / 1 h<br><br>800 °F / 1 h |

| | | |
|---|---|---|
| reddish brown still a bit lighter ↓ | 7063 | 900 °F / 1 h |
| reddish brown a bit darker and less red ↓ | 7064 | 1000 °F / 1 h |
| darker reddish brown and less red ↓ | 7065 | 1100 °F / 1 h |
| reddish brown still darker and less red ↓ | 7066 | 1200 °F / 1 h |
| reddish brown still darker and less red | 7067 | 1300 °F / 1 h (followed at «very dark iron-grey, almost black») |
| dark reddish brown | 7068 | mineral : iron pyrite<br>powder : greyish brown, with golden yellow metallic brilliance<br>origin : Rigaud Seigniory, Beauce county, Québec<br><br><u>production process:</u><br>1300 °F / 1 h (brown [light pink tone]) / irradiated with gamma[239] rays at 424.7 Mrad[81] |
| dark reddish brown | 7069 | mineral : iron pyrite<br>powder : greyish brown, with golden yellow metallic brilliance<br>origin : Rigaud Seigniory, Beauce county, Québec<br><br>mineral : sulphur<br>rock : brilliant yellow<br>powder : brilliant yellow<br>origin : unknown<br><br><u>production process:</u><br>2 g of pyrite + 2 g of sulphur / 1300 °F / 1 h |
| dark reddish brown | 7070 | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br><u>production process:</u><br>0↑1900 °F (dark iron-grey): 2 g + 100 ml hydrochloric acid / soaking: 4 years / separation of the liquid and the solid / drying on hot plate / |

| | | |
|---|---|---|
| | | colour of the solid[807] |
| dark reddish brown | 7071 | mineral : rutile<br>powder : dark brown (orange-red reflection)<br>origin : North Stradbroke Island, Queensland, Australia<br><br><u>production process:</u><br>(followed from «reddish brown»)<br>irradiated with gamma[239] rays at 604.53 Mrad |
| dark reddish brown | 7072 | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br><br><u>production process:</u><br>50 g of shale + 100 ml phosphoric acid / soaking: 3 wk. / drying on hot plate (still humid) / colour of the liquid[38] |
| dark reddish brown | 7072.1 | <u>production process:</u><br>1 g of shale + 6.50 g of powdered glass (spruce pine batch) / manual grinding / deposited on a ceramic plate at the state of a biscuit / heating in a furnace 0↑1000 °C in ambient air / slow cooling in furnace |
| dark reddish brown | 7073 | mineral : serandite<br>rock : beige (light pinkish orange tone), opaque<br>powder : light pink<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br><u>production process:</u><br>1 g of serandite + 1 g of sulphur / 1600 °F / 1 h |
| | | mineral : goethite[106]<br>powder : rusty orange<br>origin : Red Mill, in the suburbs of Cap-de-la-Madeleine, Québec<br><br>mineral : sulphur<br>rock : brilliant yellow |

| | | |
|---|---|---|
| reddish brown a bit more accentuated and dark than «dark reddish brown» | 7074 | powder : brilliant yellow<br>origin : unknown<br><br><u>production process:</u><br>0↑1400 °F / slow cooling in furnace (indian red[107]): 8 g + 96 g of sulphur / 1500 °F / 1 h (dark violet-brown): .50 g + .50 g of sulphur (dark reddish brown) / irradiated with gamma[239] rays at 602.804 Mrad[808] |
| reddish brown a bit darker than «dark reddish brown» | 7075 | mineral : magnetite<br>rock : dark grey, with metallic brilliance<br>powder : dark grey<br>origin : Fosse du Labrador, Québec<br><br>mineral : sulphur<br>rock : brilliant yellow<br>powder : brilliant yellow<br>origin : unknown<br><br><u>production process:</u><br>2 g of magnetite + 2 g of sulphur / 1300 °F / 1 h (medium reddish brown) / irradiated with gamma[239] rays at 360 Mrad[81] |
| brown (light red tone) more intense, luminous and a bit darker than «dark reddish brown» | 7076 | mineral : uraninite<br>rock : medium chocolate-brown (red Bordeau tone)<br>powder : medium milky chocolate-brown<br>origin : Yellowknife, Canada<br><br><u>production process:</u><br>8 g of uraninite + 100 ml nitric acid / soaking: 2 wk. / drying on hot plate (dark brown [light red tone]) / irradiated with gamma[239] rays at 423.88 Mrad[262] |
| | | mineral : iron pyrite<br>powder : greyish brown, with golden yellow metallic brilliance<br>origin : Rigaud Seigniory, Beauce county, Québec<br><br>mineral : sulphur<br>rock : brilliant yellow<br>powder : brilliant yellow<br>origin : unknown |

1335

| | | |
|---|---|---|
| reddish brown a bit darker and intense than «dark reddish brown» | 7077 | production process:<br>2 g of pyrite + 2 g of sulphur / 1300 °F / 1 h (dark reddish brown) / irradiated with gamma[239] rays at 424.7 Mrad[81] |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>0↑1400 °F / slow cooling in furnace (indian red[107]): 1.50 g + 1 g of feldspar (dark reddish brown) / irradiated with gamma rays at: |
| reddish brown more intense and a bit darker than «dark reddish brown»<br>↓ | 7078 | 64.7 Mrad |
| reddish brown still a bit darker [brown] and less red | 7079 | 424.7 Mrad |
| | | production process:<br>0↑1400 °F / slow cooling in furnace (indian red[107]): .25 g + .50 g of feldspar (dark brown [orange-red tone]) / irradiated with gamma[239] rays at: |
| reddish brown more red, a bit darker, more accentuated and less orange than «dark reddish brown»<br>↓ | 7080 | 64.7 Mrad |
| reddish brown darker [brown], more red and less orange | 7081 | 424.7 Mrad |
| | | production process:<br>(followed from «pinkish brown more pale than "dark pinkish brown"») |

| | | |
|---|---|---|
| reddish brown darker [brown] and less red than «dark reddish brown» | 7082 | 0↑1400 °F / slow cooling in furnace (indian red[107]): .10 g + .50 g of feldspar (dark reddish brown) / irradiated with gamma[239] rays at 424.7 Mrad |
| reddish brown darker and more intense than «dark reddish brown» | 7083 | production process: (followed from «reddish brown») 0↑1400 °F / slow cooling in furnace (indian red[107]): 1 g + .50 g of feldspar (dark brownish red) / irradiated with gamma[239] rays at 424.7 Mrad |
| reddish brown darker [brown] and less red than «dark reddish brown» | 7084 | production process: (followed from «reddish brown more pale than "dark reddish brown"») 0↑1400 °F / slow cooling in furnace (indian red[107]): .25 g + 1.50 g of feldspar (dark reddish brown) / irradiated with gamma[239] rays at 424.7 Mrad |
| reddish brown darker and less red than «dark reddish brown» | 7085 | production process: (followed from «brownish red slightly lighter than "dark brownish red"») 0↑1400 °F / slow cooling in furnace (indian red[107]): .50 g + 1.50 g of feldspar (dark reddish brown) / irradiated with gamma rays at 424.7 Mrad |
| reddish brown darker [brown] than «dark reddish brown» | 7086 | production process: 0↑1400 °F / slow cooling in furnace (indian red[107]): 1.50 g + 1 g of feldspar (dark reddish brown) / irradiated with electrons at 302,831 rad[36] |
| reddish brown darker and more red than «dark reddish brown» | 7087 | mineral : haematite<br>rock : medium chocolate-brown<br>powder : medium chocolate-brown<br>origin : Nouveau Québec, Québec<br><br>production process: 1100 °F / 1 h (reddish brown lighter than «reddish brown») / powder irradiated with gamma[239] rays at 424.7 Mrad[81] |
| reddish brown darker than | 7088 | production process: (followed from «dark chocolate-brown [red tone]») 0↑1800 °F (dark violet-brown): 4 g + 80 ml nitric acid / soaking: 2 wk. / drying on hot plate (dark |

| | | |
|---|---|---|
| «dark reddish brown» | | chocolate-brown) / irradiated with gamma[239] rays at 424.7 Mrad |
| | | mineral : magnetite<br>rock : dark grey, with metallic brilliance<br>powder : dark grey<br>origin : Fosse du Labrador, Québec<br><br>production process:<br>2 g of magnetite + 2 g of sodium carbonate / 1100 °F / 1 h (dark reddish brown) / irradiated with gamma[239] rays at: |
| reddish brown darker and more vivid than «dark reddish brown»<br>↓ | 7089 | 64.7 Mrad |
| reddish brown darker and more red | 7090 | 424.7 Mrad |
| | | mineral : almandite<br>rock : dark brownish red<br>powder : medium brownish red<br>origin : Gore Mountain, Warren county, New York state, United States<br><br>production process: |
| reddish brown darker than «dark reddish brown» | 7091 | rock irradiated with gamma rays at 63.984 Mrad<br><br>(followed at «dark brown, almost black») |
| | | mineral : ochre[128]<br>powder : black<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «brown [reddish orange tone]») |
| reddish brown darker than «dark reddish brown» | 7092 | 1 g of ochre + 1 g of halite / 0↑1500 °F<br><br>(followed at «brown [violet-red tone]») |
| | | mineral : goethite[106]<br>powder : rusty orange<br>origin : Red Mill, in the suburbs of Cap-de-la-Madeleine, Québec |

| | | |
|---|---|---|
| | | mineral : feldspar<br>rock : white, opaque<br>powder : white<br>origin : Baraute, Abitibi, Québec<br><br><u>production process:</u><br>0↑1400 °F / slow cooling in furnace (indian red[107]): 1 g + 1 g of feldspar (dark reddish brown [tends towards Burgundy red]) / irradiated with gamma[239] rays at: |
| reddish brown much darker than «dark reddish brown» | 7093 | 64.7 Mrad |
| ↓ | | |
| reddish brown darker, more black and cold (less red) | 7094 | 424.7 Mrad |
| | | <u>production process:</u><br>0↑1400 °F / slow cooling in furnace (indian red[107]): 1.50 g + 1.50 g of feldspar (dark reddish brown) / irradiated with gamma[239] rays at: |
| reddish brown much darker [brown] | 7095 | 64.7 Mrad |
| ↓ | | |
| reddish brown still darker [brown] than «dark reddish brown» | 7096 | 424.7 Mrad |
| | | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br><u>production process:</u> |
| very dark reddish brown | 7097 | 2 g of haematite + 2 g of sulphur / 1100 °F / 1 h (brown a bit darker than «medium brown») / irradiated with gamma[239] rays at 424.7 Mrad[81] |
| | | mineral : pentlandite[102]<br>rock : dark iron-grey, with silver and golden yellow metallic brilliance<br>powder : dark iron-grey (pronounced brown tone) |

| | | |
|---|---|---|
| | | origin : Inco Co., Sudbury, Ontario<br><br>production process:<br>2 g of pentlandite + 2 g of sodium carbonate / 0↑1100 °F + 1 h at 1100 °F (orange-brown) / irradiated with gamma[239] rays at: |
| blackish reddish brown<br>↓ | 7098 | 64.7 Mrad |
| reddish brown still darker, more brown and luminous | 7099 | 424.7 Mrad |
| mixture of particles | | |
| | | mineral : fuel oil soot[86]<br>powder : profound brownish black<br>origin : boiler room of Laval University, city of Québec, Québec<br><br>production process: |
| brown and orange more red and much darker than «brown» and «orange» | 7100 | 2 g of soot + 2 g of sodium carbonate / 0↑1300 °F + 1 h at 1300 °F (mixture of particles: brown / orange) / irradiated with gamma rays at 64.7 Mrad<br>(followed at «mixture of particles: pinkish brown / grey / white») |
| | | mineral : zinc concentrate grilled at 1000 °C ($ZnO-FeO)(SO_4$)<br>powder : reddish brown<br>origin : Zinc Electrolytic of Canada Co., Québec<br><br>production process:<br>(followed from «dark reddish brown») |
| reddish brown more pale than «dark reddish brown» / white | 7101 | 2 g of concentrate + 2 g of sodium carbonate / 0↑1600 °F + 1 h at 1600 °F (dark rusty brown) / irradiated with gamma[239] rays at 424.7 Mrad |
| brown (violet-red tone) | | |
| | | mineral : ochre[128]<br>powder : black<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec |

1340

| | | |
|---|---|---|
| | | production process:<br>(followed from «brown [reddish orange tone]»)<br>1 g of ochre + 3 g of halite: |
| brown (violet-red tone) | 7102 | 0↑1500 °F |
| ↓ which darkens | 7103 | 0↑1600 °F |
| and the | 7104 | 0↑1700 °F |
| violet-red tone becomes more accentuated | 7105 | 0↑1750 °F |
| | | mineral : ochre[111]<br>powder : dark reddish brown<br>origin : Red Mill, in the suburbs of Cap-de-la-Madeleine, Québec |
| | | production process: |
| brown (violet-red tone) | 7106 | 2 g of ochre + 2 g of potassium carbonate /<br>0↑1500 °F<br>(followed at «medium and vivid olive-green») |
| | | mineral : goethite[106]<br>powder : rusty orange<br>origin : Red Mill, in the suburbs of Cap-de-la-Madeleine, Québec |
| | | mineral : zirconium oxide<br>powder : light beige<br>origin : Tam Ceramic Inc., Québec |
| | | production process:<br>(followed from «brownish red [with orange reflection]») |
| brown (violet-red tone) | 7107 | 1 g of goethite + .50 g of zirconium oxide /<br>0↑1800 °F<br>(followed at «reddish brown»)<br>(followed from «brownish red a bit more accentuated than "brownish red"») |
| brown (violet-red tone)<br>↓ | 7108 | 1 g of goethite + 1 g of zirconium oxide /<br>0↑1800 °F[809]<br>(followed at «reddish brown» and «dark violet-brown [red tone]»)<br>(followed from «brownish red more accentuated than "brownish red"») |

| | | |
|---|---|---|
| brown (violet-red tone) | 7109 | 1 g of goethite + 1.50 g of zirconium oxide / 0↑1800 °F[810]<br>(followed at «reddish brown») |
| | | mineral : goethite[106]<br>powder : rusty orange<br>origin : Red Mill, in the suburbs of Cap-de-la-Madeleine, Québec<br><br>mineral : chrome<br>powder : light grey, with metallic brilliance<br><br><u>production process:</u><br>(followed from «dark indian red») |
| brown (violet-red tone) | 7110 | 1 g of goethite + 1 g of chrome / 2000 °F / 45 min. |
| | | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>8 g of ochre + 8 g of sulphur + 8 g of potassium carbonate: |
| brown (violet-red tone)<br>↓ | 7111 | 0↑1500 °F |
| brown (violet-red tone) still a bit darker<br>↓ | 7112 | 0↑1600 °F |
| brown (violet-red tone) still darker | 7113 | 0↑1700 °F<br>(followed at «dark brown-grey [light crimson tone]») |
| | | mineral : ochre[128]<br>powder : black<br>origin : Red Mill, in the suburbs of Cap-de-la-Madeleine, Québec<br><br>mineral : zirconium silicate<br>powder : white (very light yellow reflection)<br>origin : Sial Company, Québec<br><br><u>production process:</u><br>(followed from «brownish red») |
| medium brown | 7114 | 1 g of ochre + 1 g of zirconium silicate / |

| | | |
|---|---|---|
| (violet-red tone) | | 0↑1700 °F |
| medium reddish brown (light violet tone) | 7115 | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br><u>production process:</u><br>(followed from «dark rusty orange»)<br>250 g of asbestos + 1650 ml hydrochloric acid in a 2000 ml becher or asbestos entirely covered with hydrochloric acid in a vertical container / soaking: 1 wk. / drying on hot plate (formation of 2 layers of superimposed colours, the one at the surface being «dark green [mint-green type]»): 2 g + 2 g of sulphur / 1500 °F / 1 h[811] |
| brown (violet-red tone) darker than «brown (violet-red tone) [between "dark brown (violet-red tone)" and "medium brown (violet-red tone)"]» | 7116 | mineral : ochre[111]<br>powder : dark reddish brown<br>origin : Red Mill, in the suburbs of Cap-de-la-Madeleine, Québec<br><br>mineral : table salt (NaCl)<br>powder : colourless<br>origin : Sifto Company<br><br><u>production process:</u><br>(followed from «reddish brown [between "medium reddish brown" and "dark reddish brown"]»)<br>10 g of ochre + 10 g of NaCl:<br>0↑1600 °F |
| ↓ | | |
| dark brown (violet-red tone) | 7117 | 0↑1700 °F |
| | | mineral : goethite[106]<br>powder : rusty orange |

1343

| | | |
|---|---|---|
| | | origin : Red Mill, in the suburbs of Cap-de-la -Madeleine, Québec<br><br>mineral : sulphur<br>rock : brilliant yellow<br>powder : brilliant yellow<br>origin : unknown<br><br><u>production process:</u> |
| brown (light violet-red tone), lighter than «dark brown (violet-red tone)» | 7118 | 0↑1400 °F / slow cooling in furnace (indian red[107]): 8 g + 96 g of sulphur / 1500 °F / 1 h (dark violet-brown) / irradiated with gamma[239] rays at 424.7 Mrad[81] |
| | | <u>production process:</u><br>(followed from «dark violet-brown»)<br>0↑1400 °F / slow cooling in furnace (indian red[107]): |
| brown (violet-red tone) lighter than «dark brown (violet-red tone)» ↓ | 7119 | 2 g + 12 g of sulphur / 1300 °F / 1 h<br><br>(followed at «dark violet-brown») |
| brown (violet-red tone) still more red | 7120 | 2 g + 24 g of sulphur / 1300 °F / 1 h<br><br>(followed at «dark violet-brown») |
| | | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br><u>production process:</u> |
| brown (violet-red tone) lighter than «dark brown (violet-red tone)» [the red tone is more accentuated] | 7121 | 250 g of asbestos + 1650 ml hydrochloric acid in a 2000 ml becher <u>or</u> asbestos entirely covered with hydrochloric acid in a vertical container / soa-king: 1 wk. / drying on hot plate (formation of 2 layers of superimposed colours, the one at the surface being «dark green [mint-green type]»): 2 g + 2 g of sulphur / 1300 °F / 1 h (dark brown [violet-red tone]) / irradiated with gamma rays at 195.92 Mrad[81]<br>(followed at «dark orange-brown») |

| | | |
|---|---|---|
| brown (violet-red tone) lighter than «dark brown (violet-red tone)» [the red tone is more accentuated] | 7122 | <u>production process:</u><br>(followed from «chamois-brown»)<br>250 g of asbestos + 1650 ml hydrochloric acid in a 2000 ml becher <u>or</u> asbestos entirely covered with hydrochloric acid in a vertical container / soaking: 1 wk. / drying on hot plate (formation of 2 superimposed layers of colours, the one at the bottom being «dark green [light yellow tone]»): 2 g + 2 g of sulphur / 1300 °F / 1 h[811]<br>(followed at «light rusty orange» and «light grey-brown») |
| dark brown (violet-red tone) or dark red (violet-brown tone) | 7123 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>0↑1400 °F / slow cooling in furnace (indian red[107]): 2 g + 2 g of sulphur / 1300 °F / 1 h<br><br>(followed at «dark violet-brown») |
| dark reddish brown (violet reflection) | 7124 | <u>production process:</u><br>1 g of goethite + 1 g of sulphur / 0↑1700 °F / cooling: .50 g + 1 g of sulphur / 0↑1700 °F |
| dark brown (violet-red tone) | 7125 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br><u>production process:</u><br>(followed from «grey-beige [reddish orange tone]»)<br>1 g of goethite + 1 g of sulphur + 2 g of titanium dioxide / 1500 °F / 1 h<br>(followed at «medium brown-grey [violet-pink |

1345

| | | |
|---|---|---|
| | | reflection]» and «medium brownish grey [violet reflection]») |
| dark reddish brown (light violet tone) | 7126 | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «dark reddish brown»)<br>1 g of ochre + 1 g of sulphur / 0↑1700 °F |
| dark and intense brown (accentuated violet-red tone) | 7127 | mineral : ochre[128]<br>powder : black<br>origin : Red Mill, in the suburbs of Cap-de-la-Madeleine, Québec<br><br>production process:<br>(followed from «reddish brown»)<br>0↑1700 °F / slow cooling in furnace |
| dark brown (violet-red tone) | 7128 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «dark reddish brown»)<br>1 g of ochre + 1 g of halite / 0↑1600 °F<br>(followed at «greyish brown [violet-red tone]») |
| | | mineral : goethite[106]<br>powder : rusty orange<br>origin : Red Mill, in the suburbs of Cap-de-la-Madeleine, Québec<br><br>mineral : sulphur<br>rock : brilliant yellow |

| | | |
|---|---|---|
| | | powder : brilliant yellow<br>origin : unknown<br><br>production process:<br>0↑1400 °F / slow cooling in furnace (indian red[107]): 2 g + 2 g of sulphur / 1300 °F / 1 h (dark brown [violet-red tone] or dark red [violet-brown tone]) / irradiated with gamma[239] rays at: |
| brown (violet-red tone) more accentuated and darker [brown] than «dark brown (violet-red tone)»<br>↓ | 7129 | 64.7 Mrad |
| reddish brown (violet reflection) still darker [brown] and more accentuated | 7130 | 424.7 Mrad<br><br>(followed at «violet-brown [accentuated violet tone], more pronounced than "dark violet-brown"») |
| | | mineral : ochre[128]<br>powder : black<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «reddish brown darker than "dark reddish brown"»)<br>1 g of ochre + 1 g of halite: |
| brown (violet-red tone) still darker than «brown (violet-red tone) darker than "dark brown (violet-red tone)"»<br>↓ | 7131 | 0↑1600 °F |
| still darker brown (accentuated violet-red tone)<br>↓ | 7132 | 0↑1700 °F |
| still darker brown (accentuated | 7133 | 0↑1750 °F |

| | | |
|---|---|---|
| violet-red tone) | | |
| brown (violet-red tone) a bit darker than «dark brown (violet-red tone)» | 7134 | <u>production process:</u><br>(followed from «dark and vivid reddish brown»)<br>1 g of ochre + 2 g of halite / 0↑1500 °F<br><br>(followed at «brown [crimson tone]») |
| brown (light violet-red tone) darker than «dark brown (violet-red tone)» | 7135 | mineral : ochre[128]<br>powder : black<br>origin : Red Mill, in the suburbs of Cap-de-la-Madeleine, Québec<br><br>mineral : table salt (NaCl)<br>powder : colourless<br>origin : Sifto Company<br><br><u>production process:</u><br>(followed from «dark reddish brown»)<br>10 g of ochre + 10 of NaCl[812] / 0↑1600 °F<br><br>(followed at «dark violet») |
| brown (crimson tone) | | |
| dark brown (crimson tone) | 7135.1 | mineral : galena<br>rock : dark grey, with metallic brilliance<br>powder : dark grey, with metallic brilliance<br>origin : Trail, British Columbia<br><br><u>production process:</u><br>.45 g of galena + 5 g of pyrex / manual grinding / heating: 5 °C per min. 0↑1245 °C + maintenance during 1 h / cooling: 5 °C per min. until ambient temperature is reached / the entity is done in ambient air (dark chocolate-brown [orange reflection]) / irradiated with gamma rays at 9.88 Mrad |
| | | mineral : barite<br>rock : pinkish white<br><br>powder : white<br>origin : Niobec Mine, Saint-Honoré, Saguenay, Québec<br><br><u>production process:</u><br>(followed from «violet-pink») |

| | | |
|---|---|---|
| dark reddish brown (very light crimson reflection) or dark reddish brown (very light crimson reflection) | 7136 | 4 g of barite + 50 ml sulphuric acid / soaking: 2 wk. / drying on hot plate (transparent as salt) / irradiated with gamma[239] rays at 424.7 Mrad[45,571] |
| dark brown (light crimson tone) | 7136.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Québec<br><br>production process:<br>fine-grinded powder / 0↑1300 °F + 4 h at 1300 °F (yellow more accentuated than «light yellow»): 1 g + 5 g of pyrex / manual grinding / heating: 5 °C per min. 0↑1245 °C + maintenance during 1 h / cooling: 5 °C per min. until ambient temperature is reached (very, very light yellowish green) / irradiated with gamma rays at 4.94 Mrad (followed at «dark chocolate-brown [crimson tone]») |
| brown (crimson tone) slightly darker than «dark brown (crimson tone)»<br>↓ | 7137 | mineral : ochre[128]<br>powder : black<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «brown [violet-red tone]»)<br>1 g of ochre + 2 g of halite:<br>0↑1600 °F |
| brown (crimson tone) still darker | 7138 | 0↑1700 °F<br>(followed at «dark brown-grey [very light crimson tone]») |
| brown (orange-red tone) | | |
| | | mineral : granite gneiss<br>rock : reddish beige<br>powder : medium pink (light brown tone) |

| | | |
|---|---|---|
| reddish brown (light orange tone) | 7139 | origin : Lac Beauport, region of the city of Québec, Québec<br><br>production process:<br>rock irradiated with gamma rays at 244.53 Mrad[433,813]<br>(followed at «dark chocolate-brown [light orange tone]») |
| brown (orange-red tone) a bit more pale, less intense and less luminous than «medium brown (orange-red tone)» | 7140 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>0↑1400 °F / slow cooling in furnace (indian red[107]): .10 g + 1 g of feldspar (medium brown [orange-red tone]) / irradiated with gamma[239] rays at 64.7 Mrad<br>(followed at «brown [orange-red tone], darker than "medium brown [orange-red tone]"») |
| brown (orange-red tone) a bit more pale than «medium brown (orange-red tone)» | 7141 | mineral : clay<br>block : pale greyish green<br>powder : pale greyish green<br>origin : bank of Saint-Lawrence river, at the rear of the Miguasha Museum, Gaspésie, Québec<br><br>production process:<br>0↑1900 °F (medium brown [orange-red tone]) / powder irradiated with gamma rays at 64.7 Mrad<br>(followed at «brown [reddish orange tone] a bit darker than "medium brown [reddish orange tone]"») |
| medium brown (orange-red tone) | 7142 | production process:<br>0↑1900 °F |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white |

| | | |
|---|---|---|
| medium brown (orange-red tone) | 7143 | origin : Baraute, Abitibi, Québec<br>production process:<br>(followed from «dark reddish brown»)<br>0↑1400 °F / slow cooling in furnace (indian red[107]): .10 g + 1 g of feldspar<br>(followed at «medium brown [pinkish orange tone]») |
| medium brown (orange-red tone) | 7144 | mineral : almandite<br>rock : dark brownish red<br>powder : medium brownish red<br>origin : Gore Mountain, Warren county, New York state, United States<br>mineral : sulphur<br>rock : brilliant yellow<br>powder : brilliant yellow<br>origin : unknown<br>production process:<br>2 g of almandite + 2 g of sulphur / 1300 °F / 1 h |
| medium brown (orange-red tone) a bit more red and accentuated than «medium brown (orange-red tone)» | 7145 | production process:<br>2 g of almandite + 2 g of sulphur / 1300 °F / 1 h (medium brown [orange-red tone]) / irradiated with electrons at 162,431 rad |
| brown (orange-red tone) darker [more brown] and less red than «medium brown (orange-red tone)» | 7146 | mineral : goethite[106]<br>powder : rusty orange<br>origin : Red Mill, in the suburbs of Cap-de-la-Madeleine, Québec<br>mineral : feldspar<br>rock : white, opaque<br>powder : white<br>origin : Baraute, Abitibi, Québec<br>production process:<br>(followed from «brown [orange-red tone] a bit more pale, less intense and luminous than "medium brown [orange-red tone]"»)<br>0↑1400 °F / slow cooling in furnace (indian red[107]): .10 g + 1 g of feldspar (medium brown [orange-red tone]) / irradiated with gamma[239] rays at 424.7 Mrad |
| | | mineral : ochre[128]<br>powder : black<br>origin : Red Mill, in the suburbs of Cap-de-la-Madeleine, Québec |

| | | |
|---|---|---|
| brown (orange-red tone), a bit more dark than «brown (orange-red tone) darker than "medium brown (orange-red tone)"» | 7147 | production process:<br>(followed from «brown [reddish orange tone], a bit darker than "medium brown [reddish orange tone]"»)<br>0↑1500 °F<br><br>(followed at «reddish brown») |
| brown (orange-red tone) a bit less dark than «brown (orange-red tone) more pale than "dark brown (orange-red tone)"» | 7148 | mineral : goethite[106]<br>powder : rusty orange<br>origin : Red Mill, in the suburbs of Cap-de-la-Madeleine, Québec<br><br>mineral : zirconium oxide<br>powder : light beige<br>origin : Tam Ceramic Inc., Québec<br><br>production process:<br>(followed from «reddish brown more pale than "dark reddish brown"»)<br>1 g of goethite + 1 g of zirconium oxide / 0↑1900 °F (reddish brown) / irradiated with gamma[228] rays at 425.65 Mrad |
| dark brown (orange-red tone) | 7149 | mineral : armenite<br>rock : light grey<br>powder : very light grey<br>origin : Abitibi, Québec<br><br>mineral : sulphur<br>rock : brilliant yellow<br>powder : brilliant yellow<br>origin : unknown<br><br>production process:<br>2 g of armenite + 2 g of sulphur / 1300 °F / 1 h (medium orange-beige) / irradiated with gamma[239] rays at 424.7 Mrad[81] |
| | | mineral : goethite[106]<br>powder : rusty orange<br>origin : Red Mill, in the suburbs of Cap-de-la-Madeleine, Québec |

| | | |
|---|---|---|
| dark brown (orange-red tone) | 7150 | mineral : feldspar<br>rock : white, opaque<br>powder : white<br>origin : Baraute, Abitibi, Québec<br><br>production process:<br>(followed from «medium brown [pinkish orange tone»)<br>0↑1400 °F / slow cooling in furnace (indian red[107]): .25 g + .50 g of feldspar<br>(followed at «dark brown [orange-pink tone]») |
| dark brown (orange-red tone) | 7151 | production process:<br>(followed from «brown [pinkish orange tone] a bit darker than "medium brown [pinkish orange tone]"»)<br>0↑1400 °F / slow cooling in furnace (indian red[107]): 1 g + 1.50 g of feldspar (medium brown [pinkish orange tone]) / irradiated with gamma[239] rays at 424.7 Mrad |
| dark brown (orange-red tone) | 7152 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>0↑1400 °F / slow cooling in furnace (indian red[107]): 1.50 g + 1.50 g of feldspar (dark reddish brown): .50 g + .50 g of sulphur + .50 g of titanium dioxide / 1600 °F / 1 h<br>(followed at «medium brownish grey») |
| dark brown (light | 7153 | mineral : haematite<br>rock : dark brown (light red tone)<br>powder : dark brown (light red tone)<br>origin : Shefferville, Ungava, Québec<br><br>production process:<br>powder[894] irradiated with gamma[239] rays at:<br>5 Mrad |

| | | |
|---|---|---|
| orange-red tone) | 7154 | 10 Mrad |
| | 7155 | 57.4 Mrad |
| which | 7156 | 65.704 Mrad |
| evolves | 7157 | 102.4 Mrad |
| | 7158 | 124.704 Mrad |
| towards | 7159 | 148.4 Mrad |
| | 7160 | 201.6 Mrad |
| | 7161 | 247.6 Mrad |
| | 7162 | 287.3 Mrad |
| ↓ | 7163 | 360 Mrad |
| reddish brown darker and more red | 7164 | 484.704 Mrad |
| | | <u>production process:</u><br>rock irradiated with gamma rays at: |
| brown a bit darker than «dark brown (light orange-red tone)» [same orange-red tone]<br>↓ | 7165 | 122.984 Mrad[509] |
| still darker brown (light orange-red tone) | 7166 | 482.984 Mrad |
| profound brown (orange-red tone) darker and more intense than «dark brown (orange-red tone)» | 7167 | mineral : goethite[106]<br>powder : rusty orange<br>origin : Red Mill, in the suburbs of Cap-de-la-Madeleine, Québec<br><br><u>production process:</u><br>(followed from «dark brownish red more red and luminous than "dark brownish red"»)<br>0↑1400 °F / slow cooling in furnace (indian red[107]): 30 g + 100 ml hydrochloric acid / soaking: 1 wk. / drying on hot plate (dark red [light brown tone]) / irradiated with gamma[239] rays at 424.7 Mrad |
| very dark brown (orange-red tone) | 7168 | mineral : chalcopyrite<br>powder : dark grey (light green tone)<br>origin : Centre de recherche des Mines Noranda in Montréal, Québec<br><br><u>production process:</u><br>(followed from «brown [reddish orange tone] a bit lighter than "dark brown [reddish orange tone]"»)<br>4 g of chalcopyrite + 50 ml hydrochloric acid / soaking: 4 wk. / drying on hot plate (dark brown [reddish orange tone]) / irradiated with gamma[239] rays at 424.7 Mrad |

| | | |
|---|---|---|
| brown (brick-red tone) | | |
| brown (brick-red tone) | 7169 | mineral : haematite<br>rock : dark brown (light red tone)<br>powder : dark brown (light red tone)<br>origin : Shefferville, Ungava, Québec<br><br>mineral : sulphur<br>rock : brilliant yellow<br>powder : brilliant yellow<br>origin : unknown<br>production process:<br>2 g of haematite + 2 g of sulphur / 1300 °F / 1 h |
| brown (golden red tone) | | |
| dark reddish brown (golden reflection) | 7170 | mineral : biotite gneiss<br>rock : blackish grey, golden vitreous brilliance<br>powder : dark grey<br>origin : Grenville geological province, Québec<br>production process:<br>(followed from «copper-yellow with metallic reflection»)<br>0↑1700 °F |
| reddish brown (golden reflection) a bit darker [brown] than «dark reddish brown (golden reflection)» | 7171 | production process:<br>0↑1700 °F (dark reddish brown [golden reflection]) / powder irradiated with gamma rays at:<br>64.7 Mrad |
| ↓ | | |
| reddish brown (golden reflection) very lightly darker [brown] | 7172 | 424.7 Mrad |
| brown (copper-red tone) | | |
| | | mineral : biotite gneiss<br>rock : blackish grey, golden vitreous brilliance<br>powder : dark grey<br>origin : Grenville geological province, Québec |

| | | |
|---|---|---|
| medium reddish brown, with copper metallic luster | 7173 | mineral : sulphur<br>rock : brilliant yellow<br>powder : brilliant yellow<br>origin : unknown<br><br>production process:<br>1 g of gneiss + 1 g of sulphur / 1600 °F / 1 h |
| reddish brown (grey tone) | | |
| medium reddish brown (light grey tone) | 7174 | mineral : anorthosite<br>rock : light grey<br>powder : very, very light greyish beige<br>origin : rang Sainte-Germaine, Oka, Québec<br><br>mineral : sulphur<br>rock : brilliant yellow<br>powder : brilliant yellow<br>origin : unknown<br><br>production process:<br>2 g of anorthosite + 2 g of sulphur / 1300 °F / 1 h |
| reddish brown (light grey tone) a bit darker than «medium reddish brown (grey tone)» | 7175 | production process:<br>2 g of anorthosite + 2 g of sulphur / 1300 °F / 1 h (medium reddish brown [light grey tone]) / irradiated with gamma[239] rays at 424.7 Mrad[81] |
| reddish brown (grey tone) lightly beneath «dark reddish brown (grey tone)» | 7176 | mineral : haematite<br>rock : medium chocolate-brown<br>powder : medium chocolate-brown<br>origin : Nouveau Québec, Québec<br><br>production process:<br>2 g of haematite + 2 g of sodium carbonate / 0↑1500 °F + 1 h at 1500 °F (dark chocolate-brown [light red tone]) / irradiated with gamma rays at 423.88 Mrad[262] |
| dark reddish brown | 7177 | mineral : chromite<br>rock : blackish grey<br>powder : medium brownish grey<br>origin : Black Lake, near Thetford Mines, Québec<br><br>production process:<br>4 g of chromite + 100 ml nitric acid / soaking: 4 |

1356

| | | |
|---|---|---|
| (light grey tone) | | years / drying on hot plate[895] |
| dark reddish brown (grey tone) | 7178 | mineral : ochre[111]<br>powder : dark reddish brown<br>origin : Red Mill, in the suburbs of Cap-de-la -Madeleine, Québec<br><br>mineral : halite[41]<br>rock : colourless<br>powder : colourless<br>origin : Seleine Mine, Iles-de-la-Madeleine, Québec<br><br><u>production process:</u><br>(followed from «dark brownish red»)<br>1 g of ochre + 3 g of halite / 0↑1300 °F<br>(followed at «dark greyish brown [crimson tone]») |
| chestnut-brown | | |
| dark chestnut-brown | 7179 | mineral : zincite<br>rock : mixture of areas: dark grey / orange-red<br>powder : medium milky chocolate-brown (red tone)<br>origin : Franklin, New Jersey, United States<br><br><u>production process:</u><br>(followed from «chocolate-brown a bit less dark than "very dark chocolate-brown, almost black"»)<br>0↑1900 °F (black): .40 g + 50 ml nitric acid / soaking: 2 wk. / drying on hot plate (very dark chocolate-brown, almost black) / irradiated with gamma[239] rays at 424.7 Mrad |
| shale-brown | | |
| very light shale-brown | 7180 | mineral : tremolite<br>rock : medium brown (evergreen tone)<br>powder : greyish beige<br>origin : Tetreault Mine, Montauban, Portneuf county, Québec<br><br><u>production process:</u><br>2 g of tremolite + 2 g of sodium carbonate / 0↑1900 °F + 1 h at 1900 °F (grass-green) / irradiated with gamma[239] rays at 63.88 Mrad<br>(followed at «mixture of particles: iron-grey / beige») |

1357

| brown | | |
|---|---|---|
| | | mineral : halite[41]<br>rock : colourless<br>powder : colourless<br>origin : Seleine Mine, Iles-de-la-Madeleine, Québec<br><br>production process:<br>(followed from «yellow») |
| brown tint<br>↓ | 7181 | rock irradiated with a UV laser beam during 0.5 min. on a 0.04 $cm^2$ surface with a laser energy of 0.160 Joule having a flux of 1.3 x $10^8$ Watt / $cm^2$ which gives a total energy of 96 Joules |
| brown tint | 7182 | rock irradiated with a UV laser beam during 10 min. on a 0.025 $cm^2$ surface with a laser energy of 0.180 Joule having a flux of 2.4 x $10^8$ Watt / $cm^2$ which gives a total energy of 2,160 Joules<br>(followed at «orange») |
| | | mineral : amazonite<br>rock : light greenish turquoise<br>powder : white (turquoise reflection)<br>origin : Lac Sairs, Témiscamingue, Québec<br><br>production process:<br>(followed from «grey darker than "very light grey [almost white]"») |
| pale brown | 7183 | 2 g of amazonite + 2 g of sodium carbonate / 0↑1500 °F + 1:30 h at 1500 °F<br>(followed at «light cream [very light orange tone]») |
| | | mineral : asbestos[4]<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Québec<br><br>production process:<br>(followed from «light yellow») |
| pale brown | 7184 | 50 g of asbestos + 200 ml hydrochloric acid <u>or</u> asbestos entirely covered with hydrochloric acid / soaking: 1 wk. / drying on hot plate (vivid yellow): .50 g + .50 g of zirconium silicate (very light yellowish grey) / irradiated with gamma rays at 614.204 Mrad |

1358

| | | |
|---|---|---|
| pale brown | 7185 | mineral : pyrophillite<br>rock : light beige (grey and pink tones), opaque<br>powder : very light beige (grey and orange-pink tones)<br>origin : Carpentier district, Abitibi, Québec<br><br>production process:<br>rock covered with 20 ml hydrochloric acid / soaking: 2 wk. / irradiated with gamma rays at 4.88 Mrad / drying on sand bath, completed on hot plate |
| pale brown | 7186 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «cream [brown tone]»)<br>powder irradiated with gamma rays at 360 Mrad<br>(followed at «medium brown») |
| | | mineral : steatite<br>rock : light evergreen<br>powder : white<br>origin : East Broughton, Québec<br><br>production process:<br>(followed from «orange [brick-orange type]» and «chamois») |
| pale brown<br>↓ | 7187 | 0↑1600 °F (light brownish orange): 2 g + 15 ml nitric acid + 10 ml hydrochloric acid / soaking: 3 d. / drying on hot plate |
| brown a bit darker<br>↓ | 7188 | 0↑1600 °F (light brownish orange): 2 g + 10 ml nitric acid + 15 ml hydrochloric acid / soaking: 3 d. / drying on hot plate |
| brown still a bit darker | 7189 | 0↑1600 °F (light brownish orange): 2 g + 5 ml nitric acid + 20 ml hydrochloric acid / soaking: 3 d. / drying on hot plate<br>(followed at «orange more acute than "orange"») |
| | | mineral : idocrase<br>rock : yellowish green, translucid<br>powder : beige (green tone)<br>origin : Jeffrey Mine, Asbestos (presently J.-M. Asbestos), Québec |

| | | |
|---|---|---|
| pale brown | 7190 | production process:<br>(followed from «caramel-brown»)<br>1500 °F / 1 h (light beige [light green tone]) / rock irradiated with gamma rays at 424.7 Mrad |
| very, very light brown | 7191 | mineral : steatite<br>rock : light cold grey, slightly translucid<br>powder : light grey<br>origin : East Broughton, Québec<br><br>production process:<br>(followed from «very light beige [creamy beige type]»)<br>0↑1200 °F (grey more accentuated than «light grey»): 2 g + 20 ml nitric acid + 5 ml hydrochloric acid / soaking: 3 d. / drying on hot plate (followed at «creamy beige [light yellow tone]») |
| very light brown | 7192 | mineral : tiger-eye agate<br>rock : orange with silky luster, opaque<br>powder : orange with silky luster<br>origin : Africa<br><br>production process:<br>3 g of agate + 40 ml phosphoric acid / soaking: 2 wk. / drying on hot plate (still humid) / colour of the liquid[896] |
| very light brown | 7193 | mineral : bloodstone agate<br>rock : dark grass-green, slightly translucid<br>powder : light grey (light green tone)<br>origin : India<br><br>production process:<br>8 g of agate + 40 ml phosphoric acid / soaking: 2 wk. / drying on hot plate (still humid) colour of the liquid[353] |
| very light brown | 7194 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml nitric acid / soaking: 3 d. / drying on hot plate (orange): .2 g + 50 cc of transparent polyester resin + 1% of catalyst / manual grinding / moulding / hardening (very light grey [light yellow reflection]) / irradiated with with electrons at 155,082 rad<br>(followed at «grey [pronounced green tone]») |

| | | |
|---|---|---|
| very light brown | 7195 | mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>2 g of fluorine + 20 ml sulphuric acid / soaking: 3 d. / drying on hot plate (very light beige): .2 g + 50 cc of transparent polyester resin + 1% of catalyst / manual grinding / moulding / hardening (light lemon-yellow) / irradiated with electrons at 155,082 rad<br>(followed at «greenish yellow») |
| very light brown | 7196 | mineral : halite[41]<br>rock : colourless<br>powder : colourless<br>origin : Seleine Mine, Iles-de-la-Madeleine, Québec<br><br>production process:<br>2 g of halite + 20 ml nitric acid / soaking: 3 d. / drying on hot plate (white slightly milky): .3 g + 50 cc of transparent polyester resin + 1% of catalyst / manual grinding / moulding / hardening (very light grey [light yellow reflection]) / irradiated with electrons at 155,082 rad<br>(followed at «greyish brown [yellow reflection]») |
| very light brown | 7197 | mineral : olivine<br>powder : colourless (green reflection)<br>origin : Mount Haven, United States<br><br>production process:<br>.3 g of olivine + 50 cc of transparent polyester resin + 1% of catalyst / manual grinding / moulding / hardening (light grey [greenish yellow tone]) / irradiated with electrons at 155,082 rad<br>(followed at «brownish grey [intense greenish yellow reflection]») |
| | | mineral : serpentine<br>rock : yellowish green<br>powder : light greenish yellow<br>origin : probably Thetford Mines, Eastern Townships, Québec |

1361

| | | |
|---|---|---|
| very light brown | 7198 | production process:<br>3 g of serpentine + 25 ml nitric acid / soaking: 24 h / separation of the liquid and the solid / drying on hot plate (colour of the solid: light beige): .3 g + 50 cc of transparent polyester resin + 1% of catalyst / manual grinding / moulding / hardening (light orange-beige) / irradiated with electrons at 155,082 rad<br>(followed at «yellowish beige») |
| light brown | 7199 | mineral : Gaspé agate<br>rock : marbled nodule with shaded tints of white, pink and grey, slightly translucid<br>powder : very light pinkish grey<br>origin : Mont Lyall, Gaspésie, Québec<br><br>production process:<br>4 g of agate + 40 ml hydrochloric acid / soaking: 1 wk. / separation of the liquid and the solid / natural drying (colour of the solid: pale beige [with «pale apple-green particles»]) / irradiated with gamma rays at 64.7 Mrad<br>(followed at «mixture of particles: chocolate-brown / beige / pink») |
| light brown | 7200 | production process:<br>4 g of agate + 40 ml phosphoric acid / soaking: 2 wk. / drying on hot plate (still humid) / colour of the liquid[453] |
| light brown | 7201 | mineral : agate<br>rock : grey (with a light orange circular area on the surface), slightly translucid<br>powder : very light grey<br>origin : unknown<br><br>production process:<br>3 g of agate + 40 ml sulphuric acid / soaking: 14 d. / drying on hot plate (very light brownish grey [with a few green particles]) / irradiated with gamma rays at 65.65 Mrad<br>(followed at «medium milky chocolate-brown») |
| | | mineral : crocidolite<br>rock : dark greyish blue<br>powder : pale greyish blue<br>origin : Griqualand district, South Africa<br><br>mineral : sulphur |

| | | |
|---|---|---|
| light brown | 7202 | rock : brilliant yellow<br>powder : brilliant yellow<br>origin : unknown<br><br><u>production process:</u><br>(followed from «light pinkish brown»)<br>250 g of asbestos + 1650 ml hydrochloric acid in a 2000 ml becher <u>or</u> asbestos entirely covered with hydrochloric acid in a vertical container / soaking: 1 wk. / drying on hot plate (formation of 2 superimposed layers of colours, the one at the bottom being «dark green [light yellow tone]»): 2 g + 24 g of sulphur / 1300 °F / 1 h |
| light brown | 7203 | mineral : apatite<br>rock : medium brownish red<br>powder : light pinkish beige<br>origin : Ile Calumet, Pontiac county, Québec<br><br><u>production process:</u><br>3 g of apatite + 25 ml sulphuric acid / soaking: 3 d. / drying on hot plate (greyish beige): .3 g + 50 cc of transparent polyester resin + 1% of catalyst / manual grinding / moulding / hardening (light lemon-yellow) / irradiated with electrons at 155,082 rad<br>(followed at «greenish yellow») |
| light brown | 7204 | mineral : apatite<br>rock : reddish brown<br>powder : light pinkish beige<br>origin : Calumet, Pontiac county, Québec<br><br><u>production process:</u><br>3 g of apatite + 20 ml sulphuric acid / soaking: 3 d. / drying on hot plate |
| light brown | 7205 | mineral : bornite<br>rock : reddish brown (with localized green and bluish green oxidation)<br>powder : reddish brown<br>origin : Lac Musset, Fosse du Labrador, Québec<br><br><u>production process:</u><br>1500 °F / 1 h (medium reddish brown): 1 g + 40 ml hydrochloric acid / soaking: 14 d. / separation of the liquid and the solid / natural drying (colour of the solid: light green) / irradiated with gamma rays at 65.65 Mrad<br>(followed at «medium greyish brown») |

1363

| | | |
|---|---|---|
| light brown or dark beige | 7206 | mineral : fluorescent calcite<br>rock : white (localized grey or brown reflection), translucid<br>powder : white (yellow reflection)<br>origin : Bancroft, Ontario<br><br>production process:<br>0↑1000 °C |
| light brown | 7207 | production process:<br>4 g of calcite + 20 ml hydrochloric acid / soaking: 3 d. / drying on hot plate (brown): .3 g + 50 cc of transparent polyester resin + 1% of catalyst / manual grinding / moulding / hardening (light grey [light green reflection]) / irradiated with electrons at 155,082 rad<br>(followed at «greenish grey [brown reflection]») |
| light brown | 7208 | mineral : calcite (with clayey inclusions)<br>rock : very light creamy yellow, translucid<br>powder : white (yellow reflection)<br>origin : De-Mix quarry, near Saint-Philippe de Laprairie, Québec<br><br>production process:<br>(followed from «yellow [brown tone]»)<br>rock irradiated with gamma rays at 360 Mrad<br>(followed at «orange-brown darker than "light orange-brown"») |
| light brown | 7209 | mineral : cement[82]<br>powder : medium cold grey<br>origin : Union des Carrières, Limoilou, Québec<br><br>production process:<br>45 g of cement + 100 ml sulphuric acid or cement entirely covered with sulphuric acid / soaking: 3 months / drying on hot plate (medium grey [yellow tone]) / irradiated with electrons at 162,431 rad |
| light brown | 7210 | mineral : cement[82]<br>powder : medium cold grey<br>origin : Union des Carrières, Limoilou, Québec<br><br>mineral : chrome<br>powder : light grey, with metallic brilliance<br><br>production process:<br>1.50 g of cement + .50 g of chrome / 1325 °F / 1 h |

| | | |
|---|---|---|
| light brown | 7211 | mineral : diopside<br>rock : light grey<br>powder : light beige<br>origin : Mont Orford, Québec<br><br><u>production process:</u><br>0↑1900 °F (medium brown): .10 g + 80 ml of phosphoric acid / soaking: 2 wk. / drying on hot plate (still humid) / colour of the liquid[64] |
| light brown | 7212 | mineral : dolomite<br>rock : white (localized yellow reflection), crystalline and translucid<br>powder : white<br>origin : Bristol district, Pontiac county, Québec<br><br><u>production process:</u><br>(followed from «beige»)<br>rock irradiated with gamma rays at 604.53 Mrad |
| light brown | 7213 | mineral : fluorine<br>rock : violet and white, translucid<br>powder : very light grey<br>origin : Saint-Lawrence Fluorspar Company, Saint-Lawrence, Newfoundland<br><br><u>production process:</u><br>.2 g of fluorine + 50 cc of transparent polyester resin + 1% of catalyst / manual grinding / moulding / hardening (very, very light greenish yellow) / irradiated with electrons at 155,082 rad (followed at «light greenish yellow») |
| light brown | 7214 | <u>production process:</u><br>2 g of fluorine + 20 ml sulphuric acid / soaking: 3 d. / drying on hot plate |
| light brown | 7215 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>(followed from «light beige»)<br>1 g of fluorine + 1 cc of white transparent synthetic enamel paint used for the car / manual grinding / application on a piece of steel sheet |

| | | |
|---|---|---|
| | | used for the car's body measuring 1" x 1" (greyish beige) / irradiated with gamma rays at 102.4 Mrad (followed at «greyish beige») |
| light brown | 7216 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process:</u><br>2 g of fluorine + 20 ml hydrochloric acid / soaking: 3 d. / drying on hot plate |
| light brown | 7217 | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 15 g<br>powder : light grey<br>origin : East Broughton, Québec<br><br><u>production process:</u><br>(followed from «light brown [light green tone]»)<br>2 g of galena + 2 g of sodium carbonate / deposited on a steatite stick / 1500 °F / 1 h[280,897]<br>(followed at «dark brown») |
| light brown | 7218 | mineral : biotite gneiss<br>rock : blackish grey, golden vitreous brilliance<br>powder : dark grey<br>origin : Grenville geological province, Québec<br><br><u>production process:</u><br>12 g of gneiss + 40 ml phosphoric acid / soaking: 2 wk. / drying on hot plate (still humid) / colour of the liquid[898] |
| light brown | 7219 | mineral : granite gneiss<br>rock : reddish beige<br>powder : medium pink (light brown tone)<br>origin : Lac Beauport, region of the city of Québec, Québec<br><br><u>production process:</u><br>2 g of gneiss + 2 g of sodium carbonate / 0↑1500 °F + 1 h at 1500 °F |

| | | |
|---|---|---|
| | | (followed at «green [with a few yellow particles]») |
| light brown | 7220 | mineral : honey grossular garnet<br>rock : light pinkish beige<br>powder : very light beige<br>origin : Jeffrey Mine, Asbestos (presently J.-M. Asbestos), Québec<br><br>production process:<br>(followed from «light orange»)<br>rock irradiated with gamma rays at 430.4 Mrad |
| light brown | 7221 | mineral : gypsum<br>rock : white (yellow reflection)<br>powder : white (yellow reflection)<br>origin : Geisborough, Nova Scotia<br><br>production process:<br>.3 g of gypse + 50 cc of transparent polyester resin + 1% of catalyst / manual grinding / moulding / hardening (very light grey) / irradiated with electrons at 155,082 rad<br>(followed at «pale greyish green») |
| light brown | 7222 | mineral : halite[41]<br>rock : colourless<br>powder : colourless<br>origin : Seleine Mine, Iles-de-la-Madeleine, Québec<br><br>production process:<br>.3 g of halite + 50 cc of transparent polyester resin + 1% of catalyst / manual grinding / moulding / hardening (very, very light greenish yellow) / irradiated with electrons at 155,082 rad<br>(followed at «greenish yellow») |
| light brown | 7223 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 25 ml hydrochloric acid / soaking: 24 h / drying on hot plate (medium orange-brown [light green tone, khaki-green type]): .2 g + 50 cc of transparent polyester resin + 1% of catalyst / manual grinding / moulding / hardening (light grey [light green reflection]) / irradiated with electrons at 155,082 rad |

1367

| | | |
|---|---|---|
| | | (followed at «yellowish green [brown reflection]») |
| light brown | 7224 | mineral : labrador<br>rock : blackish grey<br>powder : medium grey<br>origin : Lac Saint-Jean, Québec<br><br>production process:<br>2 g of labrador + 2 g of sodium carbonate /<br>/ 0↑1700 °F + 1 h at 1700 °F (olive-green [yellow tone]) / irradiated with electrons at 162,431 rad |
| light brown | 7225 | mineral : malachite<br>rock : ribboned variety of pronounced mint-green<br>powder : light and brilliant mint-green<br>origin : Katanga province, at 300 km from Lubumbachai, Zair, Africa<br><br>production process:<br>(followed from «light brown [light green tone]»)<br>0↑750 °F<br>(followed at «dark chocolate-brown») |
| light brown | 7226 | mineral : microcline<br>rock : white (grey reflection)<br>powder : white (grey reflection)<br>origin : Buckingham, Québec<br><br>production process:<br>2 g of microcline + 2 g of sodium carbonate /<br>0↑1500 °F + 1 h at 1500 °F (light bluish green) / irradiated with gamma rays at 63.88 Mrad<br>(followed at «mixture of particles: white / grey / beige») |
| light brown | 7227 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «yellow ochre [brown tone]»)<br>0↑700 °F<br>(followed at «reddish brown») |
| | | mineral : olivine<br>powder : colourless (green reflection)<br>origin : Mount Haven, United States |

| | | |
|---|---|---|
| light brown | 7228 | production process:<br>.26 g of olivine + 50 cc of transparent polyester resin + 1% of catalyst / manual grinding / moulding / hardening (medium brownish grey) / irradiated with electrons at 155,082 rad<br>(followed at «brownish grey much darker than "medium brownish grey"») |
| light brown | 7229 | production process:<br>70 g of olivine + 100 ml nitric acid / soaking: 24 h / drying on hot plate (light and fairly vivid rusty orange): .3 g + 50 cc of transparent polyester resin + 1% of catalyst / manual grinding / moulding / hardening (medium orange [light brown reflection]) / irradiated with electrons at 155,082 rad<br>(followed at «orange [brown reflection]») |
| light brown | 7230 | mineral : orthoclase<br>rock : white (grey reflection)<br>powder : white (grey reflection)<br>origin : mine near Buckingham, Papineau county, Québec<br><br>production process:<br>2 g of orthoclase + 20 ml nitric acid / soaking: 3 d. / drying on hot plate (white [light yellow reflection]): .3 g + 50 cc of transparent polyester resin + 1% of catalyst / manual grinding / moulding / hardening (pale yellow) / irradiated with electrons at 155,082 rad<br>(followed at «yellow [light green reflection]») |
| light brown | 7231 | mineral : crystalline quartz<br>rock : colourless<br>origin : Ferme Adam, Bonsecours, Eastern Townships, Québec<br><br>production process:<br>(followed from «brownish grey tint»)<br>rock irradiated with neutrons during 20,000 seconds at $10^{12}$ neutrons / $cm^2$ /second |
| light brown | 7232 | mineral : quartz<br>rock : light pink, translucid<br>powder : very light grey<br>origin : unknown<br><br>production process:<br>4 g of quartz + 40 ml phosphoric acid / soaking: 2 wk. / drying on hot plate (still humid) / colour of the liquid[899] |

| | | |
|---|---|---|
| light brown | 7233 | mineral : quartz<br>rock : light pink, translucid<br>powder : very light grey<br>origin : unknown<br><br>mineral : sulphur<br>rock : brilliant yellow<br>powder : brilliant yellow<br>origin : unknown<br><br>production process:<br>1 g of quartz + 1 g of sulphur / 1700 °F / 1 h (medium brownish grey) / irradiated with gamma rays at 65.65 Mrad<br>(followed at «medium chocolate-brown») |
| light brown | 7234 | mineral : sardonyx<br>rock : white, slightly translucid (with a light orange-amber circular area on the surface)<br>powder : very light grey<br>origin : unknown<br><br>production process:<br>4 g of sardonyx + 40 ml phosphoric acid / soaking: 2 wk. / drying on hot plate (still humid) / colour of the liquid[453] |
| light brown | 7235 | mineral : serandite<br>rock : orange-pink or salmon (with more orange areas)<br>powder : pinkish white<br>origin : De-Mix quarry, North side of Mont Saint-Hilaire, Rouville county, Québec<br><br>production process:<br>2 g of serandite + 20 ml hydrochloric acid / soaking: 3 d. / drying on hot plate (orange-beige): .3 g + 50 cc of transparent polyester resin + 1% of catalyst / manual grinding / moulding / hardening (grey [brown and yellow tones]) / irradiated with electrons at 155,082 rad<br>(followed at «brownish yellow [green reflection]») |
| | | mineral : smaltite[25], variety of skutterudite<br>rock : dark iron-grey, with silver metallic brilliance<br>powder : dark grey<br>origin : Cobalt, Ontario |

| | | |
|---|---|---|
| light brown | 7236 | <u>production process:</u><br>3 g of smaltite + 20 ml of a cyanide[255] solution / natural drying (mixture of particles: brown / pink) / irradiated with electrons at 162,431 rad |
| light brown | 7237 | mineral : steatite<br>rock : light cold grey, slightly translucid<br>powder : light grey<br>origin : East Broughton, Québec<br><br><u>production process:</u><br>(followed from «grey [accentuated brown tone]»)<br>0↑1620 °F<br>(followed at «chamois») |
| light brown | 7238 | mineral : steatite<br>rock : light evergreen<br>powder : white<br>origin : East Broughton, Québec<br><br><u>production process:</u><br>0↑1900 °F (dark brownish orange): 2 g + 20 ml hydrochloric acid / soaking: 3 d. / drying on hot plate |
| light brown | 7239 | <u>production process:</u><br>(followed from «dark brownish orange»)<br>0↑2200 °F |
| light brown | 7240 | mineral : vesuvianite<br>rock : lilac<br>powder : lilac<br>origin : John Mansville Mine, Asbestos, Québec<br><br><u>production process:</u><br>0↑1500 °F (fairly vivid light pink): 1 g + 40 ml sulphuric acid / soaking: 6 d. / drying on hot plate (very, very pale pink [almost white]) / irradiated with gamma rays at 65.65 Mrad<br>(followed at «medium greyish brown») |
| brown darker than «light brown» | 7241 | mineral : anorthosite<br>rock : dark grey<br>powder : medium grey<br>origin : Jonquière, Lac Saint-Jean, Québec<br><br><u>production process:</u><br>6 g of anorthosite + 50 ml sulphuric acid / soaking: 2 wk. / drying on hot plate (light grey) / irradiated with gamma rays at 64.7 Mrad<br>(followed at «medium brownish grey») |

| | | |
|---|---|---|
| brown darker than «light brown» | 7242 | mineral : corundum<br>rock : medium grey<br>powder : light grey<br>origin : Transvaal, Africa<br><br><u>production process:</u><br>0↑1900 °F (brownish grey): 1 g + 50 ml hydrochloric acid / soaking: 2 wk. / drying on hot plate (light yellowish brown) / irradiated with gamma rays at 70.4 Mrad<br>(followed at «medium greyish brown [orange tone]») |
| brown a bit more pale than «brown» | 7243 | mineral : jade<br>rock : dark red (orange tone)<br>powder : orange (red tone)<br>origin : China<br><br><u>production process:</u><br>2 g of jade + 2 g of sodium carbonate / 0↑1500 °F + 1 h at 1500 °F (brown) / irradiated with gamma rays at 64.7 Mrad<br>(followed at «mixture of particles: pinkish brown grey / brownish grey / white») |
| brown | 7244 | mineral : actinolite<br>rock : cold and light evergreen<br>powder : light grey (light green tone)<br>origin : erratic block found at Saint-Philémon near Dorchester, Québec<br><br><u>production process:</u><br>(followed from «orange-beige»)<br>2 g of actinolite + 2 g of sodium carbonate / 0↑1600 °F + 1 h at 1600 °F<br>(followed at «mixture of particles: green / brown») |
| brown | 7245 | <u>production process:</u><br>3 g of actinolite + 50 ml hydrochloric acid / soaking: 2 wk. / drying on hot plate |
| brown | 7246 | mineral : Gaspé agate<br>rock : marbled nodule with shaded tints of white, pink and grey, slightly translucid<br>powder : very light pinkish grey<br>origin : Mont Lyall, Gaspésie, Québec<br><br><u>production process:</u><br>4 g of agate + 40 ml phosphoric acid / soaking: 2 wk. / drying on hot plate (still humid) / colour of the solid[900,901] |

1372

| | | |
|---|---|---|
| brown | 7247 | mineral : blue lace agate<br>rock : light violet-blue, slightly translucid<br>powder : very light grey<br>origin : Africa<br><br>production process:<br>3 g of agate + 40 ml phosphoric acid / soaking: 2 wk. / drying on hot plate (still humid) / colour of the solid[210,902] |
| brown | 7248 | mineral : sardonyx<br>rock : white, slightly translucid (with a light orange-amber circular area on the surface)<br>powder : very light grey<br>origin : unknown<br><br>production process:<br>4 g of sardonyx + 40 ml phosphoric acid / soaking: 2 wk. / drying on hot plate (still humid) / colour of the solid[901,903] |
| brown | 7249 | mineral : agate<br>rock : dark grass-green, slightly translucid<br>powder : light grey (light green tone)<br>origin : bank of Saint-Lawrence river, region of Maria, Gaspésie, Québec<br><br>mineral : chrome<br>powder : light grey, with metallic brilliance<br><br>production process:<br>1 g of agate + 1 g of chrome / 2000 °F / 45 min. |
| brown | 7250 | mineral : amazonite<br>rock : light greenish turquoise<br>powder : white (turquoise reflection)<br>origin : Lac Sairs, Témiscamingue, Québec<br><br>production process:<br>(followed from «light cream [very light orange tone]»)<br>2 g of amazonite + 2 g of sodium carbonate / 0↑1700 °F + 1 h at 1700 °F<br>(followed at «green») |
| | | mineral : asbestos[4]<br>rock : dark grey (green reflection)<br>powder : light grey (green reflection) |

| | | |
|---|---|---|
| | | origin : Asbestos Corporation Ltd,, Thetford Mines, Québec<br><br>production process:<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid beige-orange) + 40 ml nitric acid / soaking: 5 d. / separation of the liquid and the solid / drying on sand bath (colour of the liquid: light orange) / irradiated with electrons at: |
| milky brown | 7251 | 164,800 rad |
| ↓ | | |
| milky brown | 7252 | 305,200 rad[73] |
| brown | 7253 | mineral : crocidolite<br>rock : dark greyish blue<br>powder : pale greyish blue<br>origin : Griqualand district, South Africa<br><br>production process:<br>2 g of asbestos + 2 g of sodium carbonate / 0↑1800 °F + 1 h at 1800 °F (light khaki-green) / irradiated with gamma rays at 190.22 Mrad[904] (followed at «orange-brown a bit darker than "medium orange-brown"») |
| brown | 7254 | mineral : andulusite<br>rock : light brownish grey<br>powder : light grey<br>origin : Bimbowrie, South Australia<br><br>production process:<br>2 g of andulusite + 2 g of sodium carbonate / 0↑1700 °F + 1 h at 1700 °F (mixture of particles: pale greenish turquoise / olive-green) / irradiated with gamma rays at 63.88 Mrad |
| brown | 7255 | production process:<br>2 g of andulusite + 2 g of sodium carbonate / 0↑1800 °F + 1 h at 1800 °F (green) / irradiated with gamma[239] rays at 63.88 Mrad |
| brown | 7256 | mineral : anorthosite<br>rock : dark grey<br>powder : medium grey<br>origin : Jonquière, Lac Saint-Jean, Québec<br><br>production process:<br>0↑1900 °F (medium brown): .30 g + 50 ml hydrochloric acid / soaking: 2 wk. / drying on hot plate |

| | | |
|---|---|---|
| brown | 7257 | <u>production process:</u><br>0↑1900 °F (medium brown): .30 g + 50 ml nitric acid / soaking: 2 wk. / drying on hot plate |
| brown | 7258 | mineral : apatite<br>rock : pale brownish green<br>powder : very light greyish green<br>origin : Black Lake, Thetford county, Québec<br><br><u>production process:</u><br>(followed from «brownish green darker than "pale brownish green"»)<br>rock irradiated with gamma rays at 604.53 Mrad |
| brown | 7259 | mineral : apophyllite<br>rock : milky white, translucid<br>powder : white<br>origin : Gaspé Copper Mine, Gaspé, Québec<br><br><u>production process:</u><br>1 g of apophyllite + 80 ml phosphoric acid / soaking: 2 wk. / drying on hot plate (still humid) / colour of the liquid[160] |
| brown | 7260 | mineral : bauxite[92]<br>powder : pinkish beige, mat<br>origin : Alcan Company, French Guyana<br><br><u>production process:</u><br>1 g of bauxite + 1 g of sodium carbonate / 1700 °F / 1 h |
| brown | 7261 | mineral : beryl<br>rock : very light yellowish green, slightly translucid<br>powder : white (green reflection)<br>origin : Lacorne district, Abitibi, Québec<br><br><u>production process:</u><br>(followed from «creamy beige»)<br>2 g of beryl + 2 g of sodium carbonate:<br>0↑1500 °F + 15 min. at 1500 °F |
| brown a bit more accentuated | 7262 | 0↑1500 °F + 30 min. at 1500 °F |
| brown still a bit more accentuated | 7263 | 0↑1500 °F + 45 min. at 1500 °F |

| | | |
|---|---|---|
| brown still a bit more accentuated | 7264 | 0↑1500 °F + 1 h at 1500 °F |
| ↓ | | |
| darker brown | 7265 | 0↑1600 °F + 1 h at 1600 °F<br>(followed at «pale apple-green») |
| brown | 7266 | mineral : calcite[11]<br>powder : white<br>origin : Calcite du Nord Company, Saint-Eugène de Mistassini, Lac Saint-Jean, Québec<br><br>mineral : chromite[294]<br>rock : dark grey<br>powder : dark grey<br>origin : Black Lake, Eastern Townships, Québec<br><br>production process:<br>1.50 g of calcite + .50 g of chromite / 500 °C / 2 h<br>(followed at «greyish brown») |
| brown | 7267 | mineral : fluorescent calcite<br>rock : white (localized grey or brown reflection), translucid<br>powder : white (yellow reflection)<br>origin : Bancroft, Ontario<br><br>production process:<br>4 g of calcite + 20 ml hydrochloric acid / soaking: 3 d. / drying on hot plate[905] |
| brown of various | 7268 | mineral : calcite<br>rock : light pink<br>powder : pinkish white<br>origin : Huddersfield district, Pontiac county, Québec<br><br>mineral : chromite[294]<br>rock : dark grey<br>powder : dark grey<br>origin : Black Lake, Eastern Townships, Québec<br><br>production process:<br>1.50 g of calcite + .25 g of chromite / 1000 °C / 2 h |
| ¦ | 7269 | .50 g of calcite + .25 g of chromite / 1000 °C / 2 h |
| ¦ | 7270 | 1 g of calcite + .25 g of chromite / 1000 °C / 2 h |

| | | |
|---|---|---|
| | 7271 | 1.50 g of calcite + .25 g of chromite / 1000 °C / 2 h |
| | 7272 | 1.50 g of chromite + 1 g of calcite / 1000 °C / 2 h |
| | 7273 | .50 g of chromite + 1 g of calcite / 1000 °C / 2 h |
| ↓ tones | 7274 | .25 g of chromite + 1 g of calcite / 1000 °C / 2 h |
| brown | 7275 | mineral : cerite<br>rock : dark brownish grey<br>powder : light grey (light brown tone)<br>origin : Jamestown, Boulder county, Colorado, United States<br><br><u>production process:</u><br>(followed from «brownish beige [with blue particles]»)<br>2 g of cerite + 2 g of sodium carbonate / 0↑1400 °F + 1 h at 1400 °F[906]<br>(followed at «dark grass-green») |
| brown | 7276 | <u>production process:</u><br>0↑1900 °F (medium brown): .60 g + 50 ml nitric acid / soaking: 2 wk. / drying on hot plate |
| brown | 7277 | mineral : coal<br>rock : black<br>powder : brownish black<br>origin : bank of Saint-Lawrence river, city of Québec, Québec<br><br><u>production process:</u><br>(followed from «intense blackish green»)<br>2 g of coal + 2 g of sodium carbonate / 0↑1600 °F + 1 h at 1600 °F[907]<br>(followed at «mixture of particles: creamy yellow / brown / grey») |
| brown | 7278 | mineral : chromite[294]<br>rock : dark grey<br>powder : dark grey<br>origin : Black Lake, Eastern Townships, Québec<br><br><u>production process:</u><br>1000 °C / 1 h |
| brown | 7279 | <u>production process:</u><br>4 g of chromite + 20 ml hydrochloric acid / soaking: 3 d. / drying on hot plate |

1377

| | | |
|---|---|---|
| | | mineral : chromite[294]<br>rock : dark grey<br>powder : dark grey<br>origin : Black Lake, Eastern Townships, Québec<br><br>mineral : cement[269]<br>powder : medium brownish grey<br>origin : CALCO, Charlesbourg, Québec<br><br>production process: |
| brown<br>↓ | 7280 | 1.50 g of chromite + .25 g of cement / 1000 °C / 2 h |
| less dark brown | 7281 | 1.50 g of chromite + .50 g of cement / 1000 °C / 2 h<br>(followed at «brown [light green tone]») |
| brown | 7282 | production process:<br>1.50 g of cement + .50 g of chromite / 500 °C / 2 h<br>(followed at «greyish brown») |
| brown | 7283 | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br>production process:<br>1.50 g of cement + .50 g of chromite / 500 °C / 2 h<br>(followed at «greyish brown») |
| brown | 7284 | mineral : copper concentrate (Cu-FeS)<br>powder : medium chocolate-brown (grey tone)<br>origin : Centre de recherche des Mines Noranda in Montréal, Québec<br><br>production process:<br>(followed from «very dark chocolate-brown [almost black]»)<br>2 g of concentrate + 2 g of sodium carbonate / 0↑1500 °F + 1 h at 1500 °F<br>(followed at «grey») |
| | | mineral : corundum<br>rock : medium grey<br>powder : light grey<br>origin : Transvaal, Africa |

1378

| | | |
|---|---|---|
| brown | 7285 | <u>production process:</u><br>0↑1900 °F (brownish grey): 1 g + 50 ml phosphoric acid / soaking: 2 wk. / drying on hot plate (still humid) / colour of the liquid[7] |
| | | mineral : cryolite<br>rock : white, crystalline and translucid<br>powder : white<br>origin : Ivigtut, Groenland |
| brown | 7286 | <u>production process:</u><br>0↑1600 °F (white [with yellowish areas]): .20 g + 50 ml phosphoric acid / soaking: 2 wk. / drying on hot plate (still humid) / colour of the liquid[64] |
| | | mineral : diopside<br>rock : light grey<br>powder : light beige<br>origin : Mont Orford, Québec |
| brown | 7287 | <u>production process:</u><br>0↑1900 °F (medium brown): .10 g + 50 ml nitric acid / soaking: 2 wk. / drying on hot plate |
| brown | 7288 | <u>production process:</u><br>0↑1900 °F (medium brown): .10 g + 50 ml hydrochloric acid / soaking: 2 wk. / drying on hot plate |
| brown | 7289 | <u>production process:</u><br>0↑1900 °F (medium brown): .10 g + 50 ml sulphuric acid / soaking: 2 wk. / drying on hot plate |
| | | mineral : fluorine<br>rock : violet and white, translucid<br>powder : very light grey<br>origin : Saint-Lawrence Fluorspar Company, Saint-Lawrence, Newfoundland |
| brown | 7290 | <u>production process:</u><br>2 g of fluorine + 20 ml phosphoric acid / soaking: 3 d. / drying on hot plate (still humid) / colour of the solid[30] |
| | | mineral : galena<br>rock : dark grey, with metallic brilliance<br>powder : dark grey, with metallic brilliance<br>origin : Trail, British Columbia |

1379

| | | |
|---|---|---|
| | | production process:<br>(followed from «brownish green» [stainless steel]) |
| brown | 7291 | 4 g of powdered galena deposited on a piece of brass measuring 1" x 1" / 1400 °F / 20 min. / slow cooling in furnace[280,908] |
| brown | 7292 | 4 g of powdered galena deposited on a piece of galvanized iron measuring 1" x 1" / 1400 °F / 20 min. / slow cooling in furnace[280,908]<br>(followed at «grey» [aluminium] and «black» [copper - black sheet]) |
| | | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid: stick measuring 1/2" x 4 7/8" x 1/8" and weighing 15 g<br>powder : light grey<br>origin : East Broughton, Québec<br><br>production process:<br>(followed from «orange-beige», «iron-grey darker than "dark iron-grey"» and «brownish grey, mat») |
| brown | 7293 | 4 g of galena powder deposited on a stick of steatite / 1400 °F / 1 h (glaze: «orange [with small green spots]» on a stick of steatite: «golden beige at the surface and «dark iron-grey» at its depth) / irradiated with gamma rays at 424.7 Mrad / colour of the steatite stick at its surface[909]<br><br>(followed at «dark greyish brown»)<br><br>(followed from «orange-beige» and «marbled and mat grey») |
| brown ↓ | 7294 | 4 g of galena powder deposited on a stick of steatite / 1500 °F / 1 h (glaze: «orange» on a «golden beige» stick of steatite at its surface and «dark iron-grey» at its depth) / irradiated with gamma rays at 424.7 Mrad / colour of the stick of steatite at its surface[910]<br>(followed at «dark brownish grey») |
| | | mineral : goethite[106]<br>powder : rusty orange<br>origin Red Mill, in the suburbs of Cap-de-la-Madeleine, Québec |

1380

| | | |
|---|---|---|
| | | mineral : cement[1138]<br>powder : white<br><br>production process:<br>(followed from «pink more accentuated than "pink"») |
| brown<br>↓ | 7295 | 1 g of goethite + 27.40 g of cement + 13 cc of water / manual grinding / moulding / hardening / 0↑1800 °F[708] |
| more accentuated brown<br>↓ | 7296 | 1 g of goethite + 27.40 g of cement + 13 cc of water / manual grinding / moulding / hardening / 0↑1900 °F[708] |
| brown still a bit more accentuated | 7297 | 1 g of goethite + 27.40 g of cement + 13 cc of water / manual grinding / moulding / hardening / 0↑1950 °F[708] |
| | | mineral : graphite<br>rock : dark grey, with metallic brilliance<br>powder : dark grey, with metallic brilliance<br>origin : Grenville, Québec<br><br>production process: |
| brown | 7298 | 1 g of graphite + 1 g of sodium carbonate / 1800 °F / 1 h (intense emerald-green) / irradiated with gamma rays at 64.7 Mrad (followed at «mixture of particles: beige / rusty orange») |
| | | mineral : almandite<br>rock : dark brownish red<br>powder : medium brownish red<br>origin : Gore Mountain, Warren county, New York state, United States<br>production process: |
| brown | 7299 | 4 g of almandite + 50 g of phosphoric acid / soaking: 2 wk. / drying on hot plate (still humid) / colour of the liquid[7] |
| | | mineral : sandstone<br>rock : medium pinkish brown (light violet tone)<br>powder : medium pinkish brown (light violet tone)<br>origin : at the rear of Percé, Gaspésie, Québec<br><br>mineral : sulphur<br>rock : brilliant yellow<br>powder : brilliant yellow<br>origin : unknown<br>production process: |
| brown | 7300 | 1 g of sandstone + 1 g of sodium carbonate + 1 g |

| | | |
|---|---|---|
| | | of sulphur / 1700 °F / 1 h |
| brown | 7301 | mineral : jade<br>rock : dark red (orange tone)<br>powder : orange (red tone)<br>origin : China<br><br>production process:<br>2 g of jade + 2 g of sodium carbonate / 0↑1500 °F + 1 h at 1500 °F<br>(followed at «emerald-green») |
| | | mineral : malachite<br>rock : ribboned variety of pronounced mint-green<br>powder : light and brilliant mint-green<br>origin : Katanga province, at 300 km from Lubumbachai, Zair, Africa<br><br>production process:<br>(followed from «greenish turquoise [brown tone]») |
| brown | 7302 | 0↑650 °F (greenish brown [or colour between «brown» and «green»]): .50 g + 5 ml ammonia / natural drying[913] |
| brown | 7303 | 0↑700 °F (light brown [light green tone]): .50 g + 5 ml ammonia / natural drying[913] |
| brown ↓ | 7304 | 0↑750 °F (light brown): .50 g + 5 ml ammonia / natural drying[913]<br>(followed at «dark brown») |
| brown | 7305 | mineral : malachite<br>rock : ribboned variety of pronounced mint-green<br>powder : light and brilliant mint-green<br>origin : Katanga province, at 300 km from Lubumbachai, Zair, Africa<br><br>mineral : sulphur<br>rock : brilliant yellow<br>powder : brilliant yellow<br>origin : unknown<br><br>production process:<br>(followed from «black»)<br>2 g of malachite + 2 g of sulphur / 1000 °F / 1 h<br>(followed at «black») |
| | | mineral : ochre[20]<br>powder : orange<br>origin : small copper and nickel deposit, in |

1382

| | | |
|---|---|---|
| | | the South-Western area of a mass of serpentinite at 3 km at the West of Saint-Fabien-de-Panet, Québec<br><br>production process:<br>2000 °F / 45 min. |
| brown | 7306 | |
| brown | 7307 | mineral : ochre[20]<br>powder : orange<br>origin : small copper and nickel deposit, in the South-Western area of a mass of serpentinite at 3 km at the West of Saint-Fabien-de-Panet, Québec<br><br>mineral : chrome<br>powder : light grey, with metallic brilliance<br><br>production process:<br>1 g of ochre + 1 g of chrome / 2000 °F / 45 min. |
| brown | 7308 | mineral : ochre[20]<br>powder : orange<br>origin : small copper and nickel deposit, in the South-Western area of a mass of serpentinite at 3 km at the West of Saint-Fabien-de-Panet, Québec<br><br>mineral : nickel<br>powder : dark brownish grey, with metallic brilliance<br><br>production process:<br>1 g of ochre + 1 g of nickel / 2000 °F / 45 min. |
| brown | 7309 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «medium orange-brown»)<br>2 g of ochre + 2 g of sodium carbonate /<br>0↑1500 °F + 55 min. at 1500 °F<br>(followed at «dark brown») |
| | | mineral : uraninite<br>rock : medium chocolate–brown (red Bordeau tone) |

| | | |
|---|---|---|
| brown | 7310 | powder : medium milky chocolate-brown<br>origin : Yellowknife, Canada<br><br>production process:<br>2 g of uraninite + 2 g of sodium carbonate / 0↑1200 °F + 1 h at 1200 °F<br>(followed at «medium rusty brown») |
| brown | 7311 | production process:<br>0↑1900 °F (medium orange-brown): 1 g + 50 ml nitric acid / soaking: 2 wk. / drying on hot plate (followed at «grey [pronounced lilac tone with a pink reflection]») |
| brown | 7312 | mineral : pentlandite[102]<br>rock : dark iron-grey, with silver and golden yellow metalic brilliance<br>powder : dark iron-grey (pronounced brown tone)<br>origin : Inco Co., Sudbury, Ontario<br><br>production process:<br>4 g of pentlandite + 80 ml phosphoric acid / soaking: 2 wk. / drying on hot plate (still humid) / colour of the liquid[914] |
| brown | 7313 | mineral : peridotite<br>rock : medium grey<br>powder : medium brownish grey (green reflection)<br>origin : Thetford Mines, Québec<br><br>production process:<br>(followed from «mixture of particles: brown / grey / beige»)<br>1 g of peridotite + 2.50 g of sodium carbonate:<br>0↑1600 °F + 45 min. at 1600 °F |
| ↓ | | |
| brown | 7314 | 0↑1600 °F + 1 h at 1600 °F<br>(followed at «greenish beige») |
| brown | 7315 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «brick-orange»)<br>0↑2200 °F (dark pinkish brown): 3 g + 20 ml hydrochloric acid / soaking: 3 d. / drying on hot plate (followed at «pronounced olive-green») |

| | | |
|---|---|---|
| brown | 7316 | <u>production process:</u><br>2000 °F / 45 min. |
| brown | 7317 | mineral : rutile<br>powder : dark brown (orange-red reflection)<br>origin : North Stradbroke Island, Queensland, Australia<br><br><u>production process:</u><br>.40 g of rutile + 50 ml nitric acid / soaking: 2 wk. / drying on hot plate[915] |
| brown | 7318 | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br><br><u>production process:</u><br>450 °F / 10 min. |
| brown | 7319 | mineral : siderite<br>rock : caramel-brown (grey tone)<br>powder : light orange-beige<br>origin : De-Mix quarry, North side of Mont Saint-Hilaire, Rouville county, Québec<br><br><u>production process:</u><br>2 g of siderite + 2 g of sodium carbonate / 0↑1600 °F + 1 h at 1600 °F (light greenish blue) / irradiated with electrons at 162,431 rad |
| 2 areas: brown / cream (with «rusty orange» stains) | 7320 | <u>production process:</u><br>(followed from «orange-beige»)<br>1 g of siderite + 1 cc of synthetic white opaque enamel paint used for the car / manual grinding / application on a piece of steel sheet used for the car's body measuring 1" x 1" (dark creamy beige) / irradiated with gamma rays at 360 Mrad<br>(followed at «dark creamy beige») |
| | | mineral : sodalite<br>rock : light cold blue<br>powder : light grey (light blue tone)<br>origin : Bancroft, Ontario |

1385

| | | |
|---|---|---|
| brown | 7321 | production process:<br>2 g of sodalite + 2 g of sodium carbonate / 0↑1800 °F + 1 h at 1800 °F (greenish blue) / irradiated with gamma rays at 63.88 Mrad |
| brown | 7322 | mineral : stibnite<br>rock : dark grey, with silver and blue metallic brilliance<br>powder : dark grey<br>origin : Consolidated Durham Mine, Saint-Georges, New Brunswick<br><br>production process:<br>1 g of stibnite + 80 ml phosphoric acid / soaking: 2 wk. / drying on hot plate (still humid) / colour of the liquid[64] |
| brown | 7323 | mineral : fuel oil soot[86]<br>powder : profound brownish black<br>origin : boiler room of Laval University, city of Québec, Québec<br><br>production process:<br>2 g of soot + 2 g of sodium carbonate / 1000 °F / 1 h<br>(followed at «light brown [orange-pink tone]») |
| brown | 7324 | production process:<br>2 g of soot + 2 g of sodium carbonate / 0↑1000 °F + 1 h at 1000 °F<br>(followed at «brown [light pink tone]») |
| brown | 7325 | mineral : nickel sulphide<br>rock : dark grey<br>powder : dark grey<br>origin : Sudbury, Ontario<br><br>production process:<br>140 g of nickel sulphide + 100 ml nitric acid / soaking: 5 months / natural drying (colour of the solid: light green): .6 g + 50 cc of transparent polyester resin + 1% of catalyst / manual grinding / moulding / hardening (light brownish grey) / irradiated with electrons at 155,082 rad<br>(followed at «dark brownish grey [green reflection]») |
| | | mineral : tremolite<br>rock : medium brown (evergreen tone)<br>powder : greyish beige<br>origin : Tetreault Mine, Montauban, Portneuf county, Québec |

| | | |
|---|---|---|
| brown | 7326 | <u>production process:</u><br>0↑1900 °F (orange-beige): .30 g + 50 ml nitric acid / soaking: 2 wk. / drying on hot plate (medium pinkish beige [grey tone]) / irradiated with gamma rays at 64.7 Mrad<br>(followed at «dark orange-brown») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><br><u>production process:</u><br>(followed from «orange-pink») |
| brown<br>↓ | 7327 | 0↑1400 °F (pinkish beige more accentuated and pink than «pinkish beige»): 1 g + 4.50 g of cement + 3 cc of water / manual grinding / moulding / hardening / 0↑1400 °F |
| brown a bit more accentuated | 7328 | 0↑1500 °F (pinkish beige lighter than «pinkish beige»): 1 g + 4.50 g of cement + 3 cc of water / manual grinding / moulding / hardening / 0↑1500 °F<br>(followed at «light brownish beige») |
| | | mineral : zincite<br>rock : mixture of areas: dark grey / orange-red<br>powder : medium milky chocolate-brown (red tone)<br>origin : Franklin, New Jersey, United States<br><br><u>production process:</u> |
| brown | 7329 | 2 g of zincite + 2 g of sodium carbonate / 0↑1600 °F + 1 h at 1600 °F (emerald-green [very dark and intense tone]) / irradiated with gamma rays at 63.88 Mrad<br>(followed at «mixture of particles: beige [ranging from "light beige" to "dark beige"]») |
| | | mineral : jade<br>rock : dark red (orange tone)<br>powder : orange (red tone)<br>origin : China |

1387

| | | |
|---|---|---|
| brown a bit darker than «brown» | 7330 | production process:<br>2 g of jade + 2 g of sodium carbonate / 0↑1500 °F + 1 h at 1500 °F (brown) / irradiated with electrons at 162,431 rad |
| brown darker than «brown» [with a few olive-green particles] | 7331 | mineral : uraninite<br>rock : medium chocolate-brown (red Bordeau tone)<br>powder : medium milky chocolate-brown<br>origin : Yellowknife, Canada<br><br>production process:<br>(followed from «medium rusty brown»)<br>2 g of uraninite + 2 g of sodium carbonate / 0↑1400 °F + 1 h at 1400 °F<br>(followed at «mixture of particles: olive-green / medium brown») |
| the rock has 2 areas: brown and grey darker than «brown» and «grey» | 7332 | mineral : zircon<br>rock : grey and brown<br>origin : Mont Saint-Hilaire, Québec<br><br>production process:<br>irradiated with gamma rays at:<br>57.4 Mrad |
| ↓ | | |
| the rock has 2 areas: considerably darker brown and grey | 7333 | 64.7 Mrad<br>(followed at «medium chocolate-brown») |
| brown more pale than «medium brown» | 7334 | mineral : cement[82]<br>powder : medium cold grey<br>origin : Union des Carrières, Limoilou, Québec<br><br>production process:<br>(followed from «brownish grey darker than "medium brownish grey"»)<br>powder irradiated with gamma rays at:<br>201.6 Mrad |
| ↓ | | |
| brown more brown, but more pale | 7335 | 247.6 Mrad |
| ↓ | | |
| brown still more | 7336 | 287.3 Mrad |

| | | |
|---|---|---|
| brown ¦<br>¦ | | |
| brown more brown and darker<br>↓ | 7337 | 360 Mrad |
| brown still more brown | 7338 | 484.704 Mrad |
| | | mineral : anorthosite<br>rock : dark grey<br>powder : medium grey<br>origin : Jonquière, Lac Saint-Jean, Québec |
| brown lighter than «medium brown» | 7339 | <u>production process:</u><br>6 g of anorthosite + 50 ml nitric acid / soaking: 2 wk. / drying on hot plate (medium khaki-brown [yellow tone]) / irradiated with electrons at 162,431 rad |
| medium brown | 7340 | <u>production process:</u><br>0↑1900 °F |
| | | mineral : actinolite<br>rock : cold and light evergreen<br>powder : light grey (light green tone)<br>origin : erratic block found at Saint-Philémon near Dorchester, Québec |
| medium brown | 7341 | <u>production process:</u><br>3 g of actinolite + 50 ml hydrochloric acid / soaking: 2 wk. / drying on hot plate |
| | | mineral : bauxite[92]<br>powder : pinkish beige, mat<br>origin : Alcan Company, French Guyana |
| brown lighter than «medium brown» ¦<br>↓ | 7342 | <u>production process:</u><br>(followed from «beige»)<br>3 g of bauxite + 20 ml nitric acid + 5 ml hydrochloric acid / soaking: 4-5 d. / drying on hot plate |
| medium brown | 7342.1 | 3 g of bauxite + 25 ml nitric acid / soaking: 4-5 d. / drying on hot plate |
| | | mineral : calcite[11]<br>powder : white<br>origin : Calcite du Nord Company, Saint-Eugène de Mistassini, Lac Saint-Jean, Québec<br><br>mineral : hypersthene<br>rock : black |

1389

| | | |
|---|---|---|
| medium brown | 7343 | powder : medium brownish grey<br>origin : Lac Saint-Jean, Québec<br><br>production process:<br>1 g of calcite + 1 g of hypersthene / 1000 °C / 1 h |
| medium brown<br>↓<br>medium brown | 7344<br><br>7345 | mineral : cerite<br>rock : dark brownish grey<br>powder : light grey (light brown tone)<br>origin : Jamestown, Boulder county, Colorado, United States<br><br>production process:<br>0↑1900 °F<br><br>0↑2000 °F |
| medium brown | 7346 | mineral : chromite<br>rock : blackish grey<br>powder : medium brownish grey<br>origin : Black Lake, near Thetford Mines, Québec<br><br>production process:<br>4 g of chromite + 80 ml hydrochloric acid / soaking: 2 wk. / drying on hot plate (red [rusty orange tone]) / irradiated with electrons at 164,800 rad |
| medium brown | 7347 | mineral : diopside<br>rock : light grey<br>powder : light beige<br>origin : Mont Orford, Québec<br><br>production process:<br>0↑1900 °F |
| medium brown | 7348 | mineral : goethite[106]<br>powder : rusty orange<br>origin Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «brown [light red tone]»)<br>2 g of goethite + 6 g of sulphur / 400 °F / 1 h<br>(followed at «light chocolate-brown» and «chocolate-brown») |

| | | |
|---|---|---|
| medium brown | 7349 | mineral : gypsum<br>rock : white<br>powder : white<br>origin : Geisborough, Nova Scotia<br><br>production process:<br>2 g of gypsum + 20 ml sulphuric acid / soaking: 3 d. / drying on hot plate |
| medium brown | 7350 | mineral : hypersthene<br>rock : black<br>powder : medium brownish grey<br>origin : Lac Saint-Jean, Québec<br><br>production process:<br>2 g of hypersthene + 2 g of sodium carbonate / 0↑1600 °F + 15 min. at 1600 °F (dark brown) / irradiated with electrons at 162,431 rad |
| medium brown | 7351 | mineral : ochre[20]<br>powder : orange<br>origin : small copper and nickel deposit, in the South-Western area of a mass of serpentinite at 3 km at the West of Saint-Fabien-de-Panet, Québec<br><br>production process:<br>2 g of ochre + 2 g of sodium carbonate / 0↑1500 °F + 1 h at 1500 °F (blue) / irradiated with electrons at 162,431 rad |
| medium brown | 7352 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «pale brown»)<br>powder irradiated with gamma rays at 424.7 Mrad[916] |
| | 7353 | mineral : sphalerite[27]<br>rock : dark brown, with silver metallic brilliance<br>powder : dark brownish grey<br>origin : Louvem Mine, near Val d'Or, Québec<br><br>mineral : sulphur<br>rock : brilliant yellow |

1391

| | | |
|---|---|---|
| medium brown | 7354 | powder : brilliant yellow<br>origin : unknown<br><br>production process:<br>2 g of sphalerite + 2 g of sulphur / 1300 °F / 1 h |
| medium brown | 7355 | mineral : steatite<br>rock : light cold grey, slightly translucid<br>powder : light grey<br>origin : East Broughton, Québec<br><br>mineral : chrome<br>powder : light grey, with metallic brilliance<br><br>production process:<br>(followed from «dark brown»)<br>1 g of steatite + 1 g of chrome / 2000 °F / 45 min. |
| medium brown | 7356 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>2 g of iron sulphide - nickel + 2 g of sodium carbonate / 0↑1400 °F + 1 h at 1400 °F (pale mossy green) / irradiated with electrons at 162,431 rad |
| medium brown | 7357 | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br>production process:<br>(followed from «medium reddish brown»)<br>2 g of haematite + 2 g of sulphur / 1000 °F / 1 h |
| brown a bit darker | 7358 | 2 g of haematite + 2 g of sulphur / 1100 °F / 1 h |

| | | |
|---|---|---|
| brown still a bit darker | 7359 | 2 g of haematite + 2 g of sulphur / 1200 °F / 1 h<br><br>(followed at «reddish brown darker than "medium reddish brown"»)<br><br>(followed from «reddish brown darker than "medium reddish brown"») |
| ↓<br>brown still a bit darker | 7360 | 2 g of haematite + 2 g of sulphur / 1400 °F / 1 h (followed at «very dark greyish brown») |
| brown much darker than «medium brown» | 7361 | mineral : cerite<br>rock : dark brownish grey<br>powder : light grey (light brown tone)<br>origin : Jamestown, Boulder county, Colorado, United States<br><br><u>production process:</u><br>0↑2000 °F (medium brown) / powder irradiated with gamma rays at 64.7 Mrad (followed at «chocolate-brown much darker than "medium chocolate-brown"») |
| pronounced brown | 7362 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>0↑1900 °F (chamois [orange tone a bit more accentuated than «light orange tone»]): 50 g + 200 ml hydrochloric acid <u>or</u> asbestos entirely covered with hydrochloric acid / soaking: 1 wk. / drying on hot plate (vivid sunny yellow [light green tone]) / 0↑1900 °F[917,918] |
| dark brown | 7363 | mineral : actinolite<br>rock : cold and light evergreen<br>powder : light grey (light green tone)<br>origin : erratic block found at Saint-Philémon near Dorchester, Québec<br><br><u>production process:</u><br>3 g of actinolite + 50 ml hydrochloric acid / soaking: 2 wk. / separation of the liquid and the solid / drying on hot plate (rusty orange) / irradiated with electrons at 162,431 rad |

| | | |
|---|---|---|
| dark brown | 7364 | mineral : bauxite[92]<br>powder : pinkish beige, mat<br>origin : Alcan Company, French Guyana<br><br><u>production process:</u><br>(followed from «medium milky chocolate-brown»)<br>irradiated with gamma rays at 484.704 Mrad |
| dark brown | 7365 | mineral : bauxite[92]<br>powder : pinkish beige, mat<br>origin : Alcan Company, French Guyana<br><br>mineral : chrome<br>powder : light grey, with metallic brilliance<br><br><u>production process:</u><br>1 g of bauxite + 1 g of chrome / 2000 °F / 45 min. |
| dark brown, mat | 7366 | mineral : calcite[11]<br>powder : white<br>origin : Calcite du Nord Company, Saint-Eugène de Mistassini, Lac Saint-Jean, Québec<br><br>mineral : serandite<br>rock : orange-pink or salmon (with more orange areas)<br>powder : pinkish white<br>origin : De-Mix quarry, North side of Mont Saint-Hilaire, Rouville county, Québec<br><br><u>production process:</u><br>1 g of calcite + 1 g of armenite / 1000 °C / 1 h |
| dark brown | 7367 | mineral : calcite[11]<br>powder : white<br>origin : Calcite du Nord Company, Saint-Eugène de Mistassini, Lac Saint-Jean, Québec<br><br>mineral : ilmenite<br>rock : blackish grey, with metallic luster<br>powder : blackish grey, with metallic luster<br>origin : Québec Fer et Titane Co., Havre Saint-Pierre, Québec<br><br><u>production process:</u><br>1 g of calcite + 1 g of ilmenite / 1000 °C / 1 h |

| | | |
|---|---|---|
| | | mineral : calcite[11]<br>powder : white<br>origin : Calcite du Nord Company, Saint-Eugène de Mistassini, Lac Saint-Jean, Québec<br><br>mineral : labrador<br>rock : blackish grey<br>powder : medium grey<br>origin : Lac Saint-Jean, Québec<br><br>production process: |
| dark brown | 7368 | 1 g of calcite + 1 g of labrador / 1000 °C / 1 h |
| | | mineral : chalcopyrite<br>rock : brass-yellow, with metallic luster<br>powder : dark grey (with golden particles)<br>origin : Noranda Mines, Noranda, Abitibi, Québec<br><br>production process:<br>2 g of chalcopyrite + 2 g of sodium carbonate: |
| dark brown | 7369 | 0↑1200 °F + 1 h à 1200 °F |
| \| | | |
| dark brown | 7370 | 0↑1300 °F + 1 h à 1300 °F |
| ↓ | | |
| dark brown | 7371 | 0↑1400 °F + 1 h à 1400 °F<br>(followed at «light lemon-yellow») |
| | | mineral : chromite<br>rock : blackish grey<br>powder : medium brownish grey<br>origin : Black Lake, near Thetford Mines, Québec<br><br>production process: |
| dark brown | 7372 | 0↑1900 °F (medium chocolate-brown): 1 g + 50 ml hydrochloric acid / soaking: 2 wk. / drying on hot plate |
| | | mineral : cement[269]<br>powder : medium brownish grey<br>origin : CALCO, Charlesbourg, Québec<br><br>production process:<br>(followed from «mixture of particles: brown / beige») |
| dark brown | 7373 | 2 g of cement + 2 g of sodium carbonate / 0↑1600 °F + 1 h at 1600 °F<br>(followed at «metallic grey») |

| | | |
|---|---|---|
| | | mineral : cement[82]<br>powder : medium cold grey<br>origin : Union des Carrières, Limoilou, Québec<br><br>mineral : chromite<br>rock : blackish grey<br>powder : medium brownish grey<br>origin : Black Lake, near Thetford Mines, Québec<br><br>production process:<br>(followed from «medium mossy grass-green») |
| dark brown | 7374 | 1.50 g of chromite + .25 g of cement / 1000 °C / 2 h |
| brown [between «dark brown» and «brown lighter than "dark brown"»] | 7375 | .50 g of chromite + .25 g of cement / 1000 °C / 2 h |
| brown lighter than «dark brown» | 7376 | 1 g of chromite + .25 g of cement / 1000 °C / 2 h |
| | | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 5 g<br>powder : light grey<br>origin : East Broughton, Québec<br><br>production process:<br>(followed from «light brown») |
| dark brown | 7377 | 2 g of galena + 2 g of sodium carbonate / deposited on a stick of steatite / 1600 °F / 1 h[280,919]<br>(followed at «green») |
| | | mineral : hypersthene<br>rock : black<br>powder : medium brownish grey<br>origin : Lac Saint-Jean, Québec<br><br>production process: |
| dark brown | 7378 | powder irradiated with electrons at 162431 rad |

| | | |
|---|---|---|
| dark brown | 7379 | production process:<br>(followed from «orange [light brown tone]»)<br>2 g of hypersthene + 2 g of sodium carbonate / 0↑1600 °F + 15 min. at 1600 °F<br>(followed at «mixture of particles: olive-green / brown») |
| dark brown | 7380 | mineral : magnetite<br>rock : dark grey, with metallic brilliance<br>powder : dark grey<br>origin : Fosse du Labrador, Québec<br><br>production process:<br>3 g of magnetite + 80 ml sulphuric acid / soaking: 2 wk. / drying on hot plate |
| dark brown | 7381 | production process:<br>3 g of magnetite + 80 ml nitric acid / soaking: 2 wk. / drying on hot plate |
| dark brown | 7382 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «brown»)<br>0↑800 °F (dark chocolate-brown): .50 g + 5 ml ammonia / natural drying[920]<br>(followed at «brownish black») |
| dark brown | 7383 | mineral : ochre[98]<br>powder : yellow<br>origin : small copper and nickel deposit, in the South-Western area of a mass of serpentinite at 3 km at the West of Saint-Fabien-de-Panet, Québec<br><br>mineral : chrome<br>powder : light grey, with metallic brilliance<br><br>production process:<br>1 g of ochre + 1 g of chrome / 2000 °F / 45 min. |
| | | mineral : ochre[98]<br>powder : yellow<br>origin : small copper and nickel deposit, in the South-Western area of a mass of serpentinite at 3 km at the West of Saint-Fabien-de-Panet, Québec |

1397

| | | |
|---|---|---|
| | | production process: |
| | | (followed from «brown») |
| | | 2 g of ochre + 2 g of sodium carbonate: |
| dark brown | 7384 | 0↑1500 °F + 1 h at 1500 °F |
| ↓ | | |
| dark brown | 7385 | 0↑1500 °F + 1 h and 30 min. at 1500 °F |
| ↓ | | |
| dark brown | 7386 | 0↑1600 °F + 1 h at 1600 °F<br>(followed at «orange-brown») |
| dark brown | 7387 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br>production process:<br>2 g of pentlandite + 2 g of sodium carbonate / 0↑1000 °F + 1 h at 1000 °F<br>(followed at «orange-brown») |
| dark brown (accentuated brown tone) | 7388 | production process:<br>0↑1900 °F (dark iron-grey): .50 g + 50 ml hydrochloric acid / soaking: 2 wk. / drying on hot plate (blackish brown) / irradiated with gamma[239] rays at 430.4 Mrad[538] |
| dark brown | 7389 | mineral : nickeliferous pyrrhotite[23]<br>rock : dark iron-grey, with silver and golden yellow metallic brilliance<br>powder : dark iron-grey<br>origin : Inco Co., Sudbury, Ontario<br>production process:<br>4 g of pyrrhotite + 50 ml nitric acid / soaking: 2 wk. / separation of the liquid and the solid / drying on hot plate / colour of the solid[455] |
| dark brown | 7390 | production process:<br>4 g of pyrrhotite + 80 ml phosphoric acid / soaking: 2 wk. / drying on hot plate (still humid) / colour of the liquid[64] |
| dark brown | 7391 | mineral : quartz<br>rock : light pink, translucid<br>powder : very light grey<br>origin : unknown<br>mineral : sulphur<br>rock : brilliant yellow<br>powder : brilliant yellow<br>origin : unknown<br>production process:<br>1 g of quartz + 2 g of sodium carbonate + 1 g of |

| | | |
|---|---|---|
| | | sulphur / 1700 °F / 1 h |
| dark brown | 7392 | mineral : smaltite[25], variety of skutterudite<br>rock : dark iron-grey, with silver metallic brilliance<br>powder : dark grey<br>origin : Cobalt, Ontario<br><br>production process:<br>0↑1900 °F |
| dark brown (with «greenish blue traces [grey tone]»)<br>↓ | 7393 | mineral : sodalite<br>rock : indigo-blue, slightly translucid<br>powder : light grey (light blue tone)<br>origin : Africa<br>mineral : sulphur<br>rock : brilliant yellow<br>powder : brilliant yellow<br>origin : unknown<br>production process:<br>1 g of sodalite + 3 g of sodium carbonate + 1 g of sulphur / 1600 °F / 1 h |
| dark brown | 7394 | 1 g of sodalite + 2 g of sodium carbonate + 1 g of sulphur / 1600 °F / 1 h[921] |
| dark brown | 7395 | mineral : sphalerite[27]<br>rock : dark brown, with silver metallic brilliance<br>powder : dark brownish grey<br>origin : Louvem Mine, near Val d'Or, Québec<br>production process:<br>0↑1800 °F (medium chocolate-brown): 4 g + 80 ml nitric acid / soaking: 2 wk. / drying on hot plate |
| dark brown | 7396 | mineral : steatite<br>rock : light cold grey, slightly translucid<br>powder : light grey<br>origin : East Broughton, Québec<br>production process:<br>2000 °F / 45 min.<br>(followed at «medium brown») |
| | 7397 | mineral : tourmaline<br>rock : very dark grey, almost black<br>powder : very dark grey, almost black<br>origin : Villeneuve Mine, Papineau county, Québec |
| dark brown | 7398 | production process:<br>2000 °F / 20 min. |

1399

| | | |
|---|---|---|
| dark brown | 7399 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br><u>production process:</u><br>2 g of yofortierite + 2 g of sodium carbonate / 0↑1400 °F + 1 h at 1400 °F<br>(followed at «very dark brown, almost black») |
| very dark brown | 7400 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>rock covered with 20 ml hydrochloric acid / soaking: 2 wk. / irradiated with gamma rays at 11.4 Mrad / drying on sand bath, completed on hot plate[922] |
| very dark brown<br>↓<br>darker brown and more brown | 7401<br><br>7402 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br><u>production process:</u><br>1 g of yofortierite + 50 ml nitric acid / soaking: 2 wk. / drying on hot plate (very dark brown, almost black) / irradiated with gamma[239] rays at:<br>64.7 Mrad[923]<br><br>424.7 Mrad[924] |
| brown a bit more brown and less dark than «very dark brown [almost black]» | 7403 | <u>production process:</u><br>0↑1600 °F (light milky chocolate-brown): .20 g + 50 ml nitric acid / soaking: 2 wk. / drying on hot plate (very dark brown, almost black) / irradiated with gamma rays at 70.4 Mrad<br>(followed at «dark greyish brown») |

1400

| | | |
|---|---|---|
| dark brown (accentuated brown tone) | 7404 | production process:<br>2 g of yofortierite + 2 g of sodium carbonate / 0↑1500 °F + 1 h at 1500 °F (very dark brown, almost black) / irradiated with gamma rays at 64.7 Mrad (followed at «dark brownish grey») |
| very dark brown, almost black | 7405 | mineral : almandite<br>rock : dark brownish red<br>powder : medium brownish red<br>origin : Gore Mountain, Warren county, New York state, United States<br><br>production process:<br>0↑1900 °F (dark iron-grey): .50 g + 50 ml nitric acid / soaking: 2 wk. / drying on hot plate[925] |
| very dark brown, almost black | 7406 | production process:<br>(followed from «reddish brown darker than "dark reddish brown"»)<br>rock irradiated with gamma rays at 242.804 Mrad[926]<br>(followed at «blackish brown») |
| very dark brown, almost black | 7407 | mineral : halite[41]<br>rock : colourless<br>powder : colourless<br>origin : Seleine Mine, Iles-de-la-Madeleine, Québec<br><br>production process:<br>(followed from «dark chocolate-brown»)<br>rock irradiated with gamma rays at:<br>442.6 Mrad |
| ↓ | | |
| very dark brown, almost black | 7408 | 482.3 Mrad |
| ↓ | | |
| very dark brown, almost black | 7409 | 555.02 Mrad<br>(followed at «black») |
| very dark brown, almost black | 7410 | mineral : magnetite<br>rock : dark grey, with metallic brilliance<br>powder : dark grey<br>origin : Fosse du Labrador, Québec<br><br>production process:<br>0↑1900 °F (dark chocolate-brown): 1 g + 50 ml sulphuric acid / soaking: 2 wk. / drying on hot plate |

1401

| | | |
|---|---|---|
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec |
| very dark brown, almost black | 7411 | production process:<br>1 g of yofortierite + 50 ml nitric acid / soaking: 2 wk. / drying on hot plate |
| very dark brown, almost black | 7412 | production process:<br>0↑1600 °F (light milky chocolate-brown): .20 g + 50 ml nitric acid / soaking: 2 wk. / drying on hot plate |
| very dark brown, almost black | 7413 | production process:<br>0↑1600 °F (light milky chocolate-brown): .20 g + 50 ml sulphuric acid / soaking: 2 wk. / drying on hot plate |
| very dark brown, almost black | 7414 | production process:<br>(followed from «dark brown»)<br>2 g of yofortierite + 2 g of sodium carbonate / 0↑1500 °F + 1 h at 1500 °F<br>(followed at «mixture of particles: brown / very, very light grey or white») |
| | | mineral : nickeliferous pyrrhotite[23]<br>rock : dark iron-grey, with silver and golden yellow metallic brilliance<br>powder : dark iron-grey<br>origin : Inco Co., Sudbury, Ontario |
| very dark brown, almost black | 7415 | production process:<br>0↑1900 °F (dark iron-grey): .50 g + 50 ml hydrochloric acid / soaking: 2 wk. / drying on hot plate |
| very dark brown, almost black | 7416 | production process:<br>0↑1900 °F (dark iron-grey): 1 g + 50 ml hydrochloric acid / soaking: 2 wk. / drying on hot plate |
| brown a bit darker than «very dark brown, almost black» | 7417 | production process:<br>0↑1900 °F (dark iron-grey): 1 g + 50 ml hydrochloric acid / soaking: 2 wk. / drying on hot plate (very dark brown, almost black) / irradiated with gamma rays at 70.4 Mrad<br>(followed at «dark brown [reddish orange tone]») |

1402

| | | |
|---|---|---|
| brown, almost black | 7418 | mineral : almandite<br>rock : dark brownish red<br>powder : medium brownish red<br>origin : Gore Mountain, Warren county, New York state, United States<br><br>production process:<br>0↑1900 °F (dark iron-grey): .50 g + 50 ml nitric acid / soaking: 2 wk. / drying on hot plate (very dark brown, almost black) / irradiated with gamma$^{239}$ rays at 424.7 Mrad[81] |
| blackish brown | 7419 | mineral : bloody agate<br>rock : dark grass-green, slightly translucid<br>powder : light grey (light green tone)<br>origin : India<br><br>mineral : sulphur<br>rock : brilliant yellow<br>powder : brilliant yellow<br>origin : unknown<br><br>production process:<br>1 g of agate + 1 g of sulphur / 1600 °F / 1 h |
| blackish brown | 7420 | mineral : crocidolite<br>rock : dark greyish blue<br>powder : pale greyish blue<br>origin : Griqualand district, South Africa<br>mineral : sulphur<br>rock : brilliant yellow<br>powder : brilliant yellow<br>origin : unknown<br>production process:<br>1 g of asbestos + 1 g of sodium carbonate + 1 g of sulphur / 1600 °F / 1 h<br>(followed at «black») |
| blackish brown | 7421 | mineral : andulusite<br>rock : light brownish grey<br>powder : light grey<br>origin : Bimbowrie, South Australia<br><br>mineral : sulphur<br>rock : brilliant yellow<br>powder : brilliant yellow<br>origin : unknown<br>production process:<br>1 g of andulusite + 3 g of sodium carbonate + 1 g of sulphur / 0↑1600 °F<br>(followed at «mixture of particles: grass-green / blackish brown») |

1403

| | | |
|---|---|---|
| | | <u>production process:</u> |
| blackish brown | 7422 | 1 g of andulusite + 1 g of sodium carbonate + 2 g of sulphur / 0↑1600 °F<br>(followed at «mixture of particles: grass-green / blackish brown») |
| | | mineral : bornite<br>rock : reddish brown (with localized green and bluish green oxidation)<br>powder : reddish brown<br>origin : Lac Musset, Fosse du Labrador, Québec |
| | | <u>production process:</u><br>rock irradiated with gamma$^{228}$ rays at: |
| reddish brown | 7423 | 5 Mrad |
| darkens | 7424 | 10 Mrad |
| and beco- | 7425 | 57.4 Mrad |
| mes more | 7426 | 64.7 Mrad |
| brown | 7427 | 102.4 Mrad |
| evolving | 7428 | 148.4 Mrad |
| towards | 7429 | 201.6 Mrad |
| ↓ | 7430 | 247.6 Mrad |
| blackish brown | 7431 | 287.3 Mrad<br>(followed at «smoky black») |
| | | mineral : bornite<br>rock : reddish brown (with localized green and bluish green oxidation)<br>powder : reddish brown<br>origin : Lac Musset, Fosse du Labrador, Québec |
| | | mineral : sulphur<br>rock : brilliant yellow<br>powder : brilliant yellow<br>origin : unknown<br><u>production process:</u> |
| blackish brown | 7432 | 1 g of bornite + 1 g of sulphur / 1700 °F / 1 h |
| | | mineral : chalcocite<br>rock : dark iron-grey (with localized turquoise oxidation)<br>powder : dark iron-grey<br>origin : Butte, Montana, United States |
| | | <u>production process:</u><br>(followed from «iron-grey darker than "dark iron-grey"») |
| blackish brown | 7433 | rock irradiated with gamma$^{228,927}$ rays at 484.704 Mrad |

| | | |
|---|---|---|
| blackish brown | 7434 | <u>production process:</u><br>(followed from «iron-grey darker than "dark iron-grey"»)<br>powder irradiated with gamma rays at 424.7 Mrad |
| blackish brown | 7435 | mineral : coal<br>rock : black<br>powder : brownish black<br>origin : bank of Saint-Lawrence river, city of Québec, Québec<br><br><u>production process:</u><br>2 g of coal + 25 ml nitric acid / soaking: 24 h / drying on hot plate |
| blackish brown | 7436 | <u>production process:</u><br>2 g of coal + 20 ml hydrofluoric acid / soaking: 24 h / drying in drying oven at 100 °F |
| dark brown<br>↓<br>blackish brown | 7437<br><br>7438 | mineral : chromite<br>rock : blackish grey<br>powder : medium brownish grey<br>origin : Black Lake, near Thetford Mines, Québec<br><br><u>production process:</u><br>(followed from «medium brownish grey»)<br>powder irradiated with gamma rays at:<br>360 Mrad<br><br>424.7 Mrad |
| blackish brown | 7439 | mineral : cement[82]<br>powder : medium cold grey<br>origin : Union des Carrières, Limoilou, Québec<br><br>mineral : chrome<br>powder : light grey, with metallic brilliance<br><br><u>production process:</u><br>(followed from «greyish brown»)<br>1.50 g of cement + .25 g of chrome / 2350 °F / 1 h<br>(followed at «dark brownish grey») |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process:</u><br>(followed from «violet darker than "dark violet"») |

1405

| | | |
|---|---|---|
| blackish brown | 7440 | rock irradiated with gamma rays at 482.984 Mrad |
| | | mineral : galena<br>rock : dark grey, with metallic brilliance<br>powder : dark grey, with metallic brilliance<br>origin : Trail, British Columbia<br><br>production process:<br>(followed from «caramel-brown darker than "caramel-brown"»)<br>4 g of galena powder deposited on a piece of stainless steel measuring 1" x 1": |
| blackish brown | 7441 | 1700 °F / 20 min.[280] / immediate removal |
| which becomes ↓ | 7442 | 1800 °F / 20 min.[280] / immediate removal |
| still more black | 7443 | 1900 °F / 20 min.[280] / immediate removal |
| | | mineral : biotite gneiss<br>rock : blackish grey, golden vitreous brilliance<br>powder : dark grey<br>origin : Grenville geological province, Québec<br><br>production process: |
| blackish brown | 7444 | rock irradiated with gamma[228] rays at 424.7 Mrad[81] |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br>production process: |
| blackish brown | 7445 | 1 g of goethite + 2 g of sodium carbonate + 1 g of sulphur / 1600 °F / 1 h (blackish green) / irradiated with electrons at 164,800 rad |
| | | production process: |
| blackish brown | 7446 | 1 g of goethite + 3 g of sodium carbonate + 1 g of sulphur / 1600 °F / 1 h (blackish green) / irradiated with gamma rays at 65.65 Mrad<br>(followed at «dark chocolate-brown») |
| | | production process: |
| blackish brown | 7447 | 2 g of goethite + 2 g of sodium carbonate + 2 g of |

| | | |
|---|---|---|
| ↓ | | sulphur[929] / 1600 °F / 1 h<br><br>(followed at «very dark chocolate–brown, almost black»)<br>(followed from «blackish green») |
| blackish brown | 7448 | 2 g of goethite + 1 g of sodium carbonate + 1 g of sulphur / 1700 °F / 1 h |
| blackish brown | 7449 | mineral : goethite[106]<br>powder : rusty orange<br>origin : Red Mill, in the suburbs of Cap-de-la-Madeleine, Québec<br><br><u>production process:</u><br>.50 g of goethite + .50 g of sodium carbonate / deposited in a porcelain crucible closed with a cap / the entity is hermetically wrapped in bread dough / 1600 °F / 1 h |
| blackish brown | 7450 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br><u>production process:</u><br>(followed from «dark chocolate–brown [orange tone]»)<br>1 g of goethite + 1 g of sodium carbonate + 1 g of sulphur + 1 g of titanium dioxide / 1900 °F / 1 h |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : feldspar<br>rock : white, opaque<br>powder : white |

| | | |
|---|---|---|
| | | origin : Baraute, Abitibi, Québec<br><br>production process:<br>(followed from «medium brownish grey [violet-pink reflection]»)<br>0↑1400 °F / slow cooling in furnace (indian red[107]): 1.50 g + 1.50 g of feldspar (dark reddish brown): .50 g + .50 g of sulphur + .50 g of sodium carbonate / deposited in a porcelain crucible clo-sed with a cap / the entity is hermetically wrapped in bread dough / 1600 °F 1 h |
| blackish brown | 7451 | |
| | | mineral : almandite<br>rock : dark brownish red<br>powder : medium brownish red<br>origin : Gore Mountain, Warren county, New York state, United States<br><br>production process:<br>(followed from «dark chocolate-brown»)<br>2 g of almandite + 2 g of sodium carbonate /<br>0↑1800 °F + 1 h at 1800 °F<br>(followed at «greyish brown») |
| blackish brown | 7452 | |
| blackish brown | 7453 | production process:<br>(followed from «very dark brown, almost black»)<br>rock irradiated with gamma rays at 602.804 Mrad[930] |
| | | mineral : halite[41]<br>rock : colourless<br>powder : colourless<br>origin : Seleine Mine, Iles-de-la-Madeleine, Québec<br><br>production process:<br>(followed from «medium grey [light brown tone]»)<br>rock irradiated with electrons at 164,800 rad (light grey [light blue tone]), then at 155,082 rad (light lemon-yellow), then with gamma rays at: |
| blackish brown<br>↓ | 7454 | 57.4 Mrad[931] |
| blackish brown | 7455 | 102.4 Mrad[931]<br>(followed at «black») |
| | | mineral : ilmenite<br>rock : blackish grey, with metallic luster<br>powder : blackish grey, with metallic luster<br>origin : Québec Fer et Titane Co., Havre Saint-Pierre, Québec |

| | | |
|---|---|---|
| | | <u>production process:</u> |
| | | (followed from «dark grey [accentuated brown |
| | | tone]») |
| | | rock irradiated with gamma rays at: |
| medium brown | 7456 | 201.6 Mrad |
| which | 7457 | 247.6 Mrad |
| darkens | 7458 | 287.3 Mrad |
| towards | 7459 | 360 Mrad |
| ↓ | 7460 | 423.984 Mrad |
| blackish brown | 7461 | 482.984 Mrad[932,1097] |
| | | mineral : ochre[111] |
| | | powder : dark reddish brown |
| | | origin : Red Mill, in the suburbs of Cap-de-la |
| | | -Madeleine, Québec |
| | | |
| | | <u>production process:</u> |
| | | (followed from «black [light red tone]») |
| blackish brown | 7462 | 0↑1300 °F |
| | | (followed at «dark reddish brown») |
| | | mineral : pentlandite[102] |
| | | rock : dark iron-grey, with silver and gol- |
| | | den yellow metallic brilliance |
| | | powder : dark iron-grey (pronounced brown |
| | | tone) |
| | | origin : Inco Co., Sudbury, Ontario |
| | | |
| | | <u>production process:</u> |
| blackish brown | 7463 | 0↑1900 °F (dark iron-grey): .50 g + 50 ml nitric |
| | | acid / soaking: 2 wk. / drying on hot plate[933] |
| | | <u>production process:</u> |
| blackish brown | 7464 | 0↑1900 °F (dark iron-grey): .50 g + 50 ml hydro- |
| | | chloric acid / soaking: 2 wk. / drying on hot plate |
| | | mineral : peridotite |
| | | rock : medium grey |
| | | powder : medium brownish grey (green |
| | | reflection) |
| | | origin : Thetford Mines, Québec |
| | | |
| | | mineral : sulphur |
| | | rock : brilliant yellow |
| | | powder : brilliant yellow |
| | | origin : unknown |
| | | <u>production process:</u> |
| blackish brown | 7465 | 1 g of peridotite + 2 g of sodium carbonate + 1 g |
| ¦ | | of sulphur / 0↑1600 °F |
| ¦ | | |
| blackish brown | 7466 | 1 g of peridotite + 3 g of sodium carbonate + 1 g |
| ¦ | | of sulphur / 0↑1600 °F |
| ↓ | | |

| | | |
|---|---|---|
| blackish brown | 7467 | 1 g of peridotite + 1 g of sodium carbonate + 2 g of sulphur / 0↑1600 °F |
| blackish brown | 7468 | mineral : pyrolusite[101]<br>rock : black (light brown tone), mat<br>powder : black (light brown tone), mat<br>origin : probably Nova Scotia<br><br><u>production process:</u><br>2 g of pyrolusite + 2 g of potassium carbonate / 0↑1500 °F[934]<br>(followed at «very dark and powerful emerald-green») |
| blackish brown | 7469 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>0↑1900 °F (dark iron-grey): .50 g + 50 ml nitric acid / soaking: 2 wk. / drying on hot plate |
| blackish brown | 7470 | <u>production process:</u><br>0↑1900 °F (dark iron-grey): .50 g + 50 ml hydrochloric acid / soaking: 2 wk. / drying on hot plate (very dark brown, almost black) / irradiated with 430.4 Mrad[239,538] |
| blackish brown | 7471 | mineral : crystalline quartz<br>rock : colourless<br>powder : colourless<br>origin : Ferme Adam, Bonsecours, Eastern Townships, Québec<br><br><u>production process:</u><br>1 g of quartz + 1 g of sodium carbonate / 1600 °F / 1 h |
| | | mineral : serandite<br>rock : orange-pink or salmon (with more orange areas)<br>powder : pinkish white<br>origin : De-Mix quarry, North side of Mont Saint-Hilaire, Rouville county, Québec<br><br><u>production process:</u><br>(followed from «dark greyish brown»)<br>2 g of serandite + 2 g of sodium carbonate: |

1410

| | | |
|---|---|---|
| blackish brown | 7472 | 0↑1500 °F + 1 h at 1500 °F |
| blackish brown | 7473 | 0↑1600 °F + 1 h at 1600 °F |
| blackish brown | 7474 | 0↑1700 °F + 1 h at 1700 °F |
| blackish brown | 7475 | 0↑1800 °F + 1 h at 1800 °F |
| blackish brown | 7476 | 0↑1900 °F + 1 h at 1900 °F |
| blackish brown | 7477 | mineral : serandite<br>rock : beige (light pinkish orange tone), opaque<br>powder : light pink<br>origin : De-Mix quarry, North side of Mont Saint-Hilaire, Rouville county, Québec<br><br>mineral : titanium dioxide<br>powder : white<br>origin : NL Chem Canada Inc., Québec<br><br><u>production process:</u><br>12 g of serandite + 40 ml hydrochloric acid / natrual drying (very vivid orange-yellow): .50 g + .50 g of titanium dioxide / 0↑1700 °F |
| blackish brown | 7478 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>1 g of serandite + 1 g of sodium carbonate / 1600 °F / 1 h |
| blackish brown | 7479 | mineral : serpentine<br>rock : yellowish green<br>powder : light greenish yellow<br>origin : probably Thetford Mines, Eastern Townships, Québec<br><br><u>production process:</u><br>(followed from «medium orange-brown»)<br>rock irradiated with gamma rays at 604.53 Mrad[935] |
| | | mineral : siderite<br>rock : caramel-brown (grey tone)<br>powder : light orange-beige<br>origin : De-Mix quarry, North side of Mont Saint-Hilaire, Rouville county, |

1411

| | | |
|---|---|---|
| | | Québec |
| blackish brown | 7480 | production process:<br>(followed from «black»)<br>1000 °C / 1 h (blackish grey) / powder irradiated with gamma[239] rays at 482.984 Mrad |
| intense brown [with orange-caramel traces] | 7481 | production process:<br>(followed from «caramel-brown»)<br>1 g of siderite + 1 cc of synthetic white transparent enamel paint used for the car / manual grinding / application on a piece of steel sheet used for the car's body measuring 1" x 1" (light caramel-brown) / irradiated with gamma rays at:<br>57.4 Mrad[936] |
| ↓ still darker brown ↓ | 7482 | 102.4 Mrad |
| blackish brown | 7483 | 360 Mrad |
| blackish brown | 7484 | mineral : smaltite[25], variety of skutterudite<br>rock : dark iron-grey, with silver metallic brilliance<br>powder : dark grey<br>origin : Cobalt, Ontario<br><br>production process:<br>(followed from «dark brownish grey»)<br>rock irradiated with gamma rays at 484.704 Mrad[937] |
| blackish brown | 7485 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br>production process:<br>1 g of tremolite + 2 g of sodium carbonate + 1 g of sulphur / 0↑1600 °F |
| | | mineral : wilsonite, local variety of scapolite or wernerite<br>rock : grey (violet tone)<br>powder : light grey (lilac tone) |

| | | |
|---|---|---|
| blackish brown | 7486 | origin : Tetreault Mine, Montauban, Portneuf county, Québec<br><br>mineral : sulphur<br>rock : brilliant yellow<br>powder : brilliant yellow<br>origin : unknown<br><u>production process:</u><br>1 g of wilsonite + 2 g of sodium carbonate + 1 g of sulphur / 0↑1600 °F |
| blackish brown | 7487 | mineral : zincite<br>rock : mixture of areas: dark grey / orange-red<br>powder : medium milky chocolate-brown (red tone)<br>origin : Franklin, New Jersey, United States<br><br><u>production process:</u><br>4 g of zincite + 50 ml nitric acid / soaking: 2 wk. / drying on hot plate |
| blackish brown | 7488 | mineral : zircon<br>rock : grey and brown<br>origin : Mont Saint-Hilaire, Québec<br><br><u>production process:</u><br>(followed from «dark chocolate-brown»)<br>irradiated with gamma rays at 424.7 Mrad |
| blackish brown | 7489 | mineral : tourmaline<br>rock : very dark grey, almost black<br>powder : very dark grey, almost black<br>origin : Villeneuve Mine, Papineau county, Québec<br><br>mineral : sulphur<br>rock : brilliant yellow<br>powder : brilliant yellow<br>origin : unknown<br><u>production process:</u><br>2 g of tourmaline + 2 g of sulphur / 1300 °F / 1 h |
| brown a bit darker than «blackish brown» | 7490 | <u>production process:</u><br>2 g of tourmaline + 2 g of sulphur / 1300 °F / 1 h (blackish brown) / irradiated with gamma[239] rays at 424.7 Mrad[81] |

1413

| mixture of particles | | |
|---|---|---|
| pale brown / dark brown | 7491 | mineral : amazon stone<br>rock : light greenish turquoise, translucid<br>powder : white (turquoise reflection)<br>origin : unknown<br><br><u>production process:</u><br>4 g of amazon stone + 40 ml hydrochloric acid / soaking: 1 wk. / separation of the liquid and the solid / natural drying (colour of the solid: white [apple-green reflection]) / irradiated with gamma rays at 424.7 Mrad |
| light brown / milky white | 7492 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>0↑1600 °F + 15 h at 1600 °F (medium and accentuated beige [pinkish orange tone]): 2 g + 40 ml nitric acid / natural drying (white [with beige particles]) / irradiated with electrons at 164,800 rad |
| light brown / grey | 7493 | mineral : granite gneiss<br>rock : reddish beige<br>powder : medium pink (light brown tone)<br>origin : Lac Beauport, city of Québec, Québec<br><br><u>production process:</u><br>0↑1900 °F (medium beige): 1 g + 50 ml nitric acid / soaking: 2 wk. / drying on hot plate |
| brown / white | 7494 | mineral : apatite<br>rock : medium brownish red<br>powder : light pinkish beige<br>origin : Ile Calumet, Pontiac county, Québec<br><br><u>production process:</u><br>3 g of apatite + 25 ml hydrochloric acid / soaking: 3 d. / drying on hot plate |
| | | mineral : chalcopyrite<br>powder : dark grey (light green tone)<br>origin : Centre de recherche des Mines Noranda in Montréal, Québec |

| | | |
|---|---|---|
| brown / orange / grey / green | 7495 | <u>production process:</u><br>(followed from «mossy chocolate—brown [pink tone]»)<br>2 g of chalcopyrite + 2 g of sodium carbonate /<br>0↑1700 °F + 1 h at 1700 °F[938]<br>(followed at «mixture of particles: orange / brown») |
| brown / beige | 7496 | mineral : cement[269]<br>powder : medium brownish grey<br>origin : CALCO, Charlesbourg, Québec<br><br><u>production process:</u><br>2 g of cement + 2 g of sodium carbonate /<br>0↑1500 °F + 1 h at 1500 °F<br>(followed at «dark brown») |
| brown / green | 7497 | mineral : copper<br>rock : reddish brown, with metallic luster<br>powder : reddish brown, with metallic luster<br>origin : unknown<br><br><u>production process:</u><br>(followed from «mossy bottle-green»)<br>rock entirely covered with 1000 ml acetic acid / natural drying / removal of the cristals formed at the surface of the rock (the colour of the cristals is «pronounced emerald-green») / 450 °F / 10 min.[940]<br>(followed at «brownish grey») |
| brown / white (yellow reflection)<br>↓ | 7498 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>0↑1900 °F |
| brown / white (yellow reflection) | 7499 | 0↑2000 °F |
| brown / white | 7500 | mineral : orthoclase<br>rock : white (grey reflection)<br>powder : white (grey reflection)<br>origin : mine near Buckingham, Papineau county, Québec<br><br><u>production process:</u><br>2 g of orthoclase + 20 ml sulphuric acid / soaking: 3 d. / drying on hot plate |

| | | |
|---|---|---|
| brown / olive-green ↓ brown / grey / beige | 7501<br>7502 | mineral : peridotite<br>rock : medium grey<br>powder : medium brownish grey (green reflection)<br>origin : Thetford Mines, Québec<br><br><u>production process:</u><br>1 g of peridotite + 2.50 g of sodium carbonate / 0↑1600 °F + 15 min. at 1600 °F<br><br>1 g of peridotite + 2.50 g of sodium carbonate / 0↑1600 °F + 30 min. at 1600 °F (followed at «brown») |
| brown / white | 7503 | mineral : rutile<br>powder : dark brown (orange-red reflection)<br>origin : North Stradbroke Island, Queensland, Australia<br><br><u>production process:</u><br>.40 g of rutile + 50 ml sulphuric acid / soaking: 2 wk. / drying on hot plate |
| brown / white | 7504 | mineral : sphalerite[27]<br>rock : dark brown, with silver metallic brilliance<br>powder : dark brownish grey<br>origin : Louvem Mine, near Val d'Or, Québec<br><br><u>production process:</u><br>0↑1800 °F (medium chocolate-brown): 1 g + 50 ml nitric acid / soaking: 2 wk. / drying on hot plate |
| brown / orange | 7505 | mineral : fuel oil soot[86]<br>powder : profound brownish black<br>origin : boiler room of Laval University, city of Québec, Québec<br><br><u>production process:</u><br>(followed from «light brown [orange-pink tone]»)<br>2 g of soot + 2 g of sodium carbonate / 0↑1300 °F + 1 h at 1300 °F<br>(followed at «mixture of particles: green / orange-brown») |
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec |

| | | |
|---|---|---|
| | | production process:<br>(followed from «very dark brown, almost black»)<br>2 g of yofortierite + 2 g of sodium carbonate: |
| brown / very, very light grey or white ↓ | 7506 | 0↑1600 °F + 1 h at 1600 °F |
| brown / very, very light grey or white ↓ | 7507 | 0↑1700 °F + 1 h at 1700 °F |
| brown / very, very light grey or white ↓ | 7508 | 0↑1800 °F + 1 h at 1800 °F |
| brown / very, very light grey or white | 7509 | 0↑1900 °F + 1 h at 1900 °F |
| brown a bit darker than «medium brown» / orange / white | 7510 | mineral : siderite<br>rock : caramel-brown (grey tone)<br>powder : light orange-beige<br>origin : De-Mix quarry, North side of Mont Saint-Hilaire, Rouville county, Québec<br><br>production process:<br>2 g of siderite + 2 g of sodium carbonate / 0↑1300 °F + 1 h at 1300 °F (medium rusty orange) / irradiated with gamma rays at 424.7 Mrad[e1] |
| dark brown / dark grey | 7511 | mineral : beryl<br>rock : intense grass-green, slightly translucid<br>powder : greenish grey<br>origin : unknown<br><br>production process:<br>(followed from «orange [brown and green tones]»)<br>3 g of beryl + 40 ml hydrochloric acid / soaking: 1 wk. / separation of the liquid and the solid / natural drying (colour of the liquid: vivid olive-green) / irradiated with gamma rays at 424.7 Mrad |
| | | mineral : chalcopyrite<br>powder : dark grey (light green tone)<br>origin : Centre de recherche des Mines Noranda in Montréal, Québec |

| | | |
|---|---|---|
| dark brown / light grey / medium beige / white | 7512 | <u>production process:</u><br>2 g of chalcopyrite + 2 g of sodium carbonate / 0↑1500 °F + 1 h at 1500 °F (mossy brown) / irradiated with gamma rays at 424.7 Mrad[81,239] |
| dark brown / dark iron-grey / white | 7513 | mineral : hypersthene<br>rock : black<br>powder : medium brownish grey<br>origin : Lac Saint-Jean, Québec<br><br><u>production process:</u><br>2 g of hypersthene + 2 g of sodium carbonate / 0↑1900 °F + 1 h at 1900 °F (grass-green [light brown tone]) / irradiated with gamma rays at 423.88 Mrad[262] |
| dark brown / light brown | 7514 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br><u>production process:</u><br>0↑1600 °F (light milky chocolate-brown): .20 g + 50 ml nitric acid / soaking: 2 wk. / drying on hot plate (very dark brown, almost black) / irradiated with electrons at 162,431 rad |
| brown, grey and beige lighter than «very dark brown» and «grey» and «beige» | 7515 | mineral : Gaspé agate<br>rock : marbled nodule with shaded tints of white, pink and grey, slightly translucid<br>powder : very light pinkish grey<br>origin : Mont Lyall, Gaspésie, Québec<br><br><u>production process:</u><br>4 g of agate + 40 ml sulphuric acid / soaking: 18 d. / drying on hot plate (mixture of particles: very dark brown / grey / beige) / irradiated with gamma rays at 65.65 Mrad<br>(followed at «mixture of particles: medium milky chocolate-brown / dark chocolate-brown») |
| very dark brown / grey / beige | 7516 | <u>production process:</u><br>4 g of agate + 40 ml sulphuric acid / soaking: 18 d. / drying on hot plate |
| | | mineral : pyrolusite[101]<br>rock : black (light brown tone), mat<br>powder : black (light brown tone), mat |

| | | |
|---|---|---|
| blackish brown / light grey | 7517 | origin : probably Nova Scotia<br><br>production process:<br>(followed from «brownish black»)<br>2 g of pyrolusite + 2 g of sodium carbonate / 1600 °F / 1 h (powerful emerald-green) / irradiated with gamma[239] rays at 424.7 Mrad |
| brown ochre | | |
| medium brown ochre | 7517.1 | mineral : bauxite[92]<br>powder : pinkish beige, mat<br>origin : Alcan Company, French Guyana<br><br>production process:<br>1 g of bauxite + 5 g of pyrex / manual grinding / heating: 5 °C per min. 0↑1245 °C + maintenance during 1 h / cooling: 5 °C per min. until ambient temperature is reached / the entity is done in ambient air (medium orange-brown) / irradiated with gamma rays at 9.88 Mrad |
| dark brown ochre | 7518 | mineral : agate<br>rock : dark grass-green, slightly translucid<br>powder : light grey (light green tone)<br>origin : bank of Saint-Lawrence river, region of Maria, Gaspésie, Québec<br><br>production process:<br>(followed from «dark and intense olive-green»)<br>2 g of agate + 2 g of sodium carbonate / 0↑1900 °F + 1 h at 1900 °F (emerald-green) / irradiated with gamma rays at 424.7 Mrad |
| dark brown ochre | 7519 | mineral : goethite[106]<br>powder : rusty orange<br>origin : Red Mill, in the suburbs of Cap-de-la-Madeleine, Québec<br><br>production process:<br>10 g of goethite + 100 ml hydrochloric acid / soaking: 1 wk. / drying on hot plate |
| brown ochre (green tone) | | |
| | | mineral : crocidolite<br>rock : dark greyish blue<br>powder : pale greyish blue<br>origin : Griqualand district, South Africa |

1419

| | | |
|---|---|---|
| light brown ochre (green reflection) | 7520 | <u>production process:</u><br>(followed from «brown ochre [reddish orange tone]»)<br>2 g of asbestos + 2 g of sodium carbonate / 0↑1400 °F + 1 h at 1400 °F<br>(followed at «orange-brown») |
| brown ochre (caramel tone) | | |
| | | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>1 g of mica + 6.50 g of powdered glass (spruce pine batch) / manual grinding / deposited on a ceramic plate at the state of a biscuit / heating in a furnace 0↑1000 °C in ambient air / slow cooling in furnace («medium honey-yellow flakes [in suspension in the glass]) / irradiated with gamma rays at: |
| medium brown ochre (caramel tone) | 7520.1 | 2.47 Mrad |
| ↓ | | |
| darker brown ochre (caramel tone) | 7520.2 | 4.94 Mrad |
| ↓ | | |
| brown ochre (caramel tone) a bit darker | 7520.3 | 7.41 Mrad |
| ↓ | | |
| brown ochre (caramel tone) a bit darker | 7520.4 | 9.88 Mrad |
| brown ochre (caramel tone and green reflection) | | |
| | | mineral : galena<br>rock : dark grey, with metallic brilliance<br>powder : dark grey, with metallic brilliance<br>origin : Trail, British Columbia<br><br><u>production process:</u><br>approximately 150 g of molten glass (sodalime) is «collected» at the state of fusion (1200 °C) in the furnace on a metal rod / 2 g of galena are sprinkled at the surface of the glass / then, the |

1420

| | | |
|---|---|---|
| | | «collect» is removed from the metal rod («dark olive-green glaze [with metallic grey reflections]» opaque, mat and shiny) / deposited on a ceramic plate at the state of a biscuit / heating in furnace 0↑1000 °C / the furnace is turned off / cooling in furnace (limpid transparent white) / irradiated with gamma rays at: |
| medium brown ochre (caramel tone and light green reflection) | 7520.5 | 2.47 Mrad |
| ↓ | | |
| darker brown ochre (caramel tone and light green reflection) | 7520.6 | 4.94 Mrad |
| ↓ | | |
| still darker brown ochre (caramel tone and light green reflection) | 7520.7 | 7.41 Mrad |
| ↓ | | |
| still darker brown ochre (caramel tone and light green reflection) | 7520.8 | 9.88 Mrad |
| brown ochre (orange tone) | | |
| brown ochre (orange tone) a bit darker than «brown ochre (orange tone)» | 7521 | mineral : crocidolite<br>rock : dark greyish blue<br>powder : pale greyish blue<br>origin : Griqualand district, South Africa<br><br>production process:<br>2 g of crocidolite + 2 g of sodium carbonate / 1300 °F / 1 h (brown ochre [reddish orange tone]) / irradiated with gamma rays at 190.22 Mrad<br><br>(followed at «medium pinkish brown») |
| brown ochre (reddish orange tone) | | |
| brown ochre (reddish orange tone) | 7522 | mineral : crocidolite<br>rock : dark greyish blue<br>powder : pale greyish blue<br>origin : Griqualand district, South Africa<br><br>production process:<br>(followed from «medium khaki-green»)<br>2 g of crocidolite + 2 g of sodium carbonate / 1300 °F / 1 h<br>(followed at «light orange-brown») |

| | | |
|---|---|---|
| brown ochre (reddish orange tone) | 7523 | <u>production process:</u><br>(followed from «medium khaki-green [orange-brown tone]»)<br>2 g of crocidolite + 2 g of sodium carbonate / 0↑1300 °F + 1 h at 1300 °F<br>(followed at «light brown ochre [green reflection]») |
| brown ochre (rusty tone) | | |
| brown ochre (rusty tone) | 7524 | mineral : beryl<br>rock : light blue (near turquoise), slightly translucid<br>powder : light grey<br>origin : Lacorne district, Abitibi, Québec<br><br><u>production process:</u><br>(followed from «khaki-green more intense than "medium khaki-green"»)<br>1 g of beryl + 1 cc of synthetic white transparent enamel paint used for the car / manual grinding / application on a piece of steel sheet used for the car's body measuring 1" x 1" (beige-cream) / irradiated with gamma rays at 102.4 Mrad<br>(followed at «beige») |
| brown ochre (red tone) | | |
| brown ochre (red tone) | 7525 | mineral : galena<br>rock : dark grey, with metallic brilliance<br>powder : dark grey, with metallic brilliance<br>origin : Trail, British Columbia<br><br><u>production process:</u><br>(followed from «caramel-brown [orange tone]»)<br>1 g of galena + 1 g of sodium carbonate / grinded and distributed in the porcelain lids of porcelain crucibles / 0↑1800 °F[280,944]<br>(followed at «caramel-brown [orange tone]») |
| brown ochre (pink tone) | | |
| light brown ochre (pink tone) | 7526 | mineral : orpiment<br>rock : vivid yellow (orange tone)<br>powder : vivid yellow (orange tone)<br>origin : Nevada, United States<br><br><u>production process:</u><br>0↑1300 °F |
| milky chocolate-brown | | |
| | | mineral : crystalline quartz<br>rock : colourless |

1422

| | | |
|---|---|---|
| light milky chocolate-brown tint | 7527 | powder : colourless<br>origin : Ferme Adam, Bonsecours, Eastern Townships, Québec<br><br>production process:<br>rock irradiated with electrons at 155,082 rad |
| pale milky chocolate-brown | 7528 | mineral : sphalerite[27]<br>rock : dark grey, with golden yellow metallic brilliance<br>powder : dark brownish grey<br>origin : Matagami Mine, Matagami, Québec<br><br>production process:<br>(followed from «very light cream»)<br>4 g of sphalerite + 25 ml nitric acid / soakig: 3 d. / separation of the liquid (1st) and the solid / addition of 25 ml nitric acid to the same solid / soaking: 3 d. / separation in 3 parts: a) liquid (2nd) at the surface; b) layer in the middle: a mixture of liquid and solid; c) solid at the bottom of the solution / natural drying (colour of the 2nd liquid: light greyish beige) / the 2nd liquid is irradiated with gamma rays at 424.7 Mrad |
| very, very light milky chocolate-brown | 7529 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «caput-mortuum a bit more accentuated than "light caput-mortuum"»)<br>.50 g of goethite + 1.50 g of titanium dioxide:<br>0↑1700 °F |
| ↓ | | |
| more accentuated milky chocolate-brown | 7530 | 0↑1800 °F<br><br>(followed at «dark milky chocolate-brown») |
| | | production process:<br>(followed from «darker or more brown caput-mortuum [light violet-pink tone]») |

1423

| | | |
|---|---|---|
| light milky chocolate-brown<br>↓<br>more accentuated milky chocolate-brown | 7531<br><br>7532 | .50 g of goethite + .50 g of titanium dioxide (whitened rusty orange):<br>0↑1700 °F<br><br>0↑1800 °F<br>(followed at «dark milky chocolate-brown») |
| light milky chocolate-brown | 7533 | mineral : halite[41]<br>rock : colourless<br>powder : colourless<br>origin : Seleine Mine, Iles-de-la-Madeleine, Québec<br><br>production process:<br>(followed from «orange-brown»)<br>2 g of halite + 2 g of sodium carbonate /<br>0↑1300 °F + 1 h at 1300 °F (medium orange-brown) /<br>irradiated with gamma rays at 424.7 Mrad |
| light milky chocolate-brown | 7534 | mineral : serandite<br>rock : white<br>powder : white<br>origin : De-Mix quarry, North side of Mont Saint-Hilaire, Rouville county, Québec<br><br>production process:<br>(followed from «orange darker than "brownish orange"»)<br>rock irradiated with gamma rays at 484.704 Mrad |
| light milky chocolate-brown<br>↓<br>milky chocolate-brown a bit darker | 7535<br><br>7536 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «brownish grey darker than "light brownish grey"»)<br>powder irradiated with gamma rays at:<br>360 Mrad<br><br>484.704 Mrad |

| | | |
|---|---|---|
| light milky chocolate-brown | 7537 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «medium milky chocolate-brown»)<br>0↑1600 °F<br>(followed at «dark greyish brown») |
| milky chocolate-brown | 7538 | mineral : goethite[106]<br>powder : rusty orange<br>origin : Red Mill, in the suburbs of Cap-de-la-Madeleine, Québec<br><br>production process:<br>3 g of goethite + 20 ml hydrofluoric acid / soaking: 24 h / drying in drying oven at 100 °F |
| milky chocolate-brown [between «light milky chocolate-brown» and «medium milky chocolate-brown»] | 7539 | mineral : fluorescent calcite<br>rock : white (localized grey or brown reflection), translucid<br>powder : white (yellow reflection)<br>origin : Bancroft, Ontario<br><br>mineral : sulphur<br>rock : brilliant yellow<br>powder : brilliant yellow<br>origin : unknown<br><br>production process:<br>2 g of fluorescent calcite + 2 g of sulphur / 1300 °F / 1 h (orange-chamois) / irradiated with electrons at 302,831 rad[36] |
| medium milky chocolate-brown | 7540 | mineral : Gaspé agate<br>rock : marbled nodule of shaded tints of white, pink and light grey<br>powder : very light pinkish grey<br>origin : Mont Lyall, Gaspésie, Québec<br><br>production process:<br>(followed from «light caramel-brown»)<br>4 g of agate + 40 ml hydrochloric acid / soaking: 1 wk. / separation of the liquid and the solid / natural drying (colour of the liquid: apple-green |

| | | |
|---|---|---|
| | | [orange tone]) / irradiated with gamma rays at 424.7 Mrad |
| medium milky chocolate-brown | 7541 | mineral : agate<br>rock : grey (with a light orange circular area on the surface), slightly translucid<br>powder : very light grey<br>origin : unknown<br><br>production process:<br>(followed from «light brown»)<br>3 g of agate + 40 ml sulphuric acid / soaking: 14 d. / drying on hot plate (very light brownish grey [with a few green particles]) / irradiated with gamma rays at 425.65 Mrad |
| medium milky chocolate-brown | 7542 | mineral : bauxite[92]<br>powder : pinkish beige, mat<br>origin : Alcan Company, French Guyana<br><br>production process:<br>(followed from «salmon [brown tone] or salmon-brown»)<br>irradiated with gamma rays at 360 Mrad<br>(followed at «dark brown») |
| medium milky chocolate-brown | 7543 | mineral : chromite<br>rock : blackish grey<br>powder : medium brownish grey<br>origin : Black Lake, near Thetford Mines, Québec<br><br>production process:<br>0↑1900 °F (medium chocolate-brown): 1 g + 50 ml nitric acid / soaking: 2 wk. / drying on hot plate |
| | 7544 | mineral : cinnabar<br>rock : medium grey (with red traces on the surface)<br>origin : unknown |
| medium milky chocolate-brown | 7545 | production process:<br>(followed from «medium brownish grey»)<br>rock irradiated with gamma[239] rays at 602.804 Mrad |
| | | mineral : corundum<br>rock : medium grey<br>powder : light grey<br>origin : Transvaal, Africa |

1426

| | | |
|---|---|---|
| medium milky chocolate-brown | 7546 | <u>production process:</u><br>(followed from «beige»)<br>2 g of corundum + 20 ml hydrofluoric acid / soaking: 24 h / drying in drying oven at 100 °F (mixture of particles: beige / orange-brown) / irradiated with gamma rays at 424.7 Mrad |
| medium milky chocolate-brown | 7547 | mineral : corundum<br>rock : rusty yellow<br>powder : light grey<br>origin : Mount Eagle, Ontario<br><br><u>production process:</u><br>(followed from «beige»)<br>2 g of corundum + 25 ml sulphuric acid / soaking: 24 h / drying on hot plate (medium beige [light grey tone]) / irradiated with gamma rays at 424.7 Mrad |
| medium milky chocolate-brown | 7548 | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>4 g of mica + 50 ml hydrochloric acid / soaking: 4 wk. / drying on hot plate (pronounced beige [pinkish orange tone]) / irradiated with gamma rays at 424.7 Mrad |
| medium milky chocolate-brown | 7549 | mineral : uraninite<br>rock : medium chocolate-brown (red Bordeau tone)<br>powder : medium milky chocolate-brown<br>origin : Yellowknife, Canada<br><br><u>production process:</u><br>powder irradiated with gamma$^{228}$ rays at:<br>5 Mrad |
| milky chocolate-brown a bit darker | 7550 | 10 Mrad |
| milky chocolate-brown still a bit darker | 7551 | 57.4 Mrad |

| | | |
|---|---|---|
| milky chocolate-brown still a bit darker | 7552 | 64.7 Mrad |
| milky chocolate-brown still a bit darker | 7553 | 102.4 Mrad |
| milky chocolate-brown slightly darker | 7554 | 148.4 Mrad |
| milky chocolate-brown a bit darker | 7555 | 201.6 Mrad |
| milky chocolate-brown still a bit darker | 7556 | 247.6 Mrad |
| ↓ milky chocolate-brown a bit darker | 7557 | 287.3 Mrad<br>(followed at «milky chocolate-brown [orange tone]») |
| medium milky chocolate-brown | 7558 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>0↑1400 °F<br>(followed at «light milky chocolate-brown») |
| milky chocolate-brown a bit more pale than «milky chocolate-brown darker than "medium milky | 7559 | mineral : uraninite<br>rock : medium chocolate-brown (red Bordeau tone)<br>powder : medium milky chocolate-brown<br>origin : Yellowknife, Canada<br><br>production process:<br>(followed from «milky chocolate-brown [orange tone] darker than "medium milky chocolate-brown [orange tone]"»)<br>powder irradiated with gamma[228,239] rays at 424.7 Mrad |

1428

| | | |
|---|---|---|
| chocolate-brown"» | | |
| milky chocolate-brown a bit darker than «medium milky chocolate-brown» | 7560 | mineral : zincite<br>rock : mixture of areas: dark grey / orange-red<br>powder : medium milky chocolate-brown (red tone)<br>origin : Franklin, New Jersey, United States<br><br>production process:<br>(followed from «medium milky chocolate-brown [orange tone]»)<br>0↑1300 °F<br><br>(followed at «medium milky chocolate-brown») |
| dark milky chocolate-brown | 7561 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «pinkish orange lighter than "pinkish orange"»)<br>3 g of asbestos + 5 ml nitric acid + 20 ml hydrochloric acid / soaking: 3 d. / drying on hot plate (rusty orange) / irradiated with gamma[228] rays at 550.22 Mrad |
| dark milky chocolate-brown | 7562 | mineral : apatite<br>rock : medium brownish red<br>powder : light pinkish beige<br>origin : Ile Calumet, Pontiac county, Québec<br><br>production process:<br>(followed from «pinkish brown»)<br>powder[945] irradiated with gamma rays at 424.7 Mrad |
| dark milky chocolate-brown | 7563 | mineral : fluorine<br>rock : pale lilac-grey, opaque<br>powder : pale grey (light lilac tone)<br>origin : Saint-Lawrence Fluorspar Company, Saint-Lawrence, Newfoundland<br><br>production process:<br>2 g of fluorine + 20 ml nitric acid / soaking: 3 d. / drying on hot plate |

| | | |
|---|---|---|
| dark milky chocolate-brown | 7564 | mineral : magnetite<br>rock : dark grey, with metallic brilliance<br>powder : dark grey<br>origin : Fosse du Labrador, Québec<br><br><u>production process:</u><br>2 g of magnetite + 2 g of sodium carbonate / 1800 ºF / 1 h<br>(followed at «dark chocolate-brown») |
| dark milky chocolate-brown | 7565 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>(followed from «black»)<br>1 g of goethite + 2 g of sodium carbonate + 1 g of sulphur / 1600 ºF / 1 h (blackish green) / irradiated with gamma rays at 425.65 Mrad |
| dark milky chocolate-brown | 7566 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white<br><br><u>production process:</u><br>(followed from «medium milky chocolate-brown [pink tone]»)<br>0↑1400 ºF / slow cooling in furnace (indian red[107]): .50 g + 1.50 g of feldspar (dark reddish brown): 1 g + 4.50 g of cement + 3 cc of water / manual grinding / moulding / hardening / 0↑1900 ºF (followed at «medium milky chocolate-brown [grey tone]») |
| | | mineral : goethite[106]<br>powder : rusty orange<br>origin : Red Mill, in the suburbs of Cap-de-la-Madeleine, Québec |

| | | |
|---|---|---|
| dark milky chocolate-brown | 7567 | mineral : titanium dioxide<br>powder : white<br>origin : NL Chem Canada Inc., Québec<br><br>production process:<br>(followed from «light milky chocolate-brown more accentuated than "light milky chocolate-brown"»)<br>.50 g of goethite + .50 g of titanium dioxide (whitened rusty orange) / 0↑2100 °F<br>(followed at «caput-mortuum [accentuated pinkish lilac tone]») |
| dark milky chocolate-brown | 7568 | production process:<br>(followed from «milky chocolate-brown [grey tone]»)<br>.50 g of goethite + 1 g of titanium dioxide / 0↑1900 °F<br>(followed at «light lilac») |
| dark milky chocolate-brown | 7569 | production process:<br>(followed from «milky chocolate-brown more accentuated than "very, very light milky chocolate-brown"»)<br>.50 g of goethite + 1.50 g of titanium dioxide / 0↑2100 °F<br>(followed at «caput-mortuum [brown tone]») |
| milky chocolate-brown darker than «dark milky chocolate-brown» | 7570 | production process:<br>(followed from «dark greyish milky chocolate-brown [pink tone]»)<br>1 g of goethite + 2 g of sodium carbonate + 1 g of titanium dioxide / 1600 °F / 1 h<br>(followed at «medium greyish milky chocolate-brown [orange tone]») |
| mixture of particles | | |
| pale milky chocolate-brown / pale milky chocolate-brown (light pink tone) / pale grey | 7571 | mineral : cerite<br>rock : dark brownish grey<br>powder : light grey (light brown tone)<br>origin : Jamestown, Boulder county, Colorado, United States<br><br>production process:<br>(followed from «medium brown [light orange tone]»)<br>2 g of cerite + 2 g of sodium carbonate / 0↑1500 °F + 1 h at 1500 °F (dark grass-green) / irradiated with gamma rays at 424.7 Mrad |
| | | mineral : chalcocite<br>rock : dark iron-grey (with localized turquoise oxidation)<br>powder : dark iron-grey |

| | | |
|---|---|---|
| light milky chocolate-brown/medium milky chocolate-brown (green reflection) / light greenish grey | 7572 | origin : Butte, Montana, United States<br><br>production process:<br>4 g of chalcocite + 100 ml sulphuric acid / soaking: 2 wk. / separation of the liquid and the solid / drying on hot plate (colour of the liquid: light and intense mint-green) / irradiated with gamma rays at 424.7 Mrad[81] |
| medium milky chocolate-brown / dark chocolate-brown | 7573 | mineral : Gaspé agate<br>rock : marbled nodule of shaded tints of white, pink and light grey<br>powder : very light pinkish grey<br>origin : Mont Lyall, Gaspésie, Québec<br><br>production process:<br>(followed at «mixture of particles: brown / grey / beige»)<br>4 g of agate + 40 ml sulphuric acid / soaking: 18 d. / drying on hot plate (mixture of particles: grey / very dark brown / beige) / irradiated with gamma[228] rays at 425.65 Mrad |
| medium milky chocolate-brown / light milky chocolate-brown / dark milky chocolate-brown / dark grey / light grey | 7574 | mineral : bornite<br>rock : reddish brown (with localized green and bluish green oxidation)<br>powder : reddish brown<br>origin : Lac Musset, Fosse du Labrador, Québec<br><br>production process:<br>(followed from «pale beige»)<br>2 g of bornite + 20 ml hydrochloric acid + 5 ml nitric acid / soaking: 6 d. / separation of the liquid and the solid / natural drying (colour of the solid: very light yellowish green) / irradiated with gamma rays at 425.65 Mrad |
| medium milky chocolate-brown / white | 7575 | mineral : tremolite<br>rock : medium brown (evergreen tone)<br>powder : greyish beige<br>origin : Tetreault Mine, Montauban, Portneuf county, Québec<br><br>production process:<br>(followed from «mixture of particles: medium brown / medium grey»)<br>1 g of tremolite + 1.50 g of sodium carbonate / 1600 °F / 1 h (dark grass-green) / irradiated with gamma rays at 550.22 Mrad |

| | | |
|---|---|---|
| milky chocolate-brown (green tone) | | |
| medium milky chocolate-brown (green reflection) | 7576 | mineral : chalcocite<br>rock : dark iron-grey (with localized turquoise oxidation)<br>powder : dark iron-grey<br>origin : Butte, Montana, United States<br><br>production process:<br>(followed at «olive-green [light mint-green tone]») 4 g of chalcocite + 100 ml sulphuric acid / soaking: 2 wk. / separation of the liquid and the solid / drying on hot plate (colour of the solid: intense olive-green) / irradiated with gamma rays at 424.7 Mrad |
| medium milky chocolate-brown (very light green reflection) | 7577 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «apple-green much more luminous and intense than "light apple-green"») 5 g of iron sulphide - nickel + 15 ml hydrochloric acid + 10 ml water / soaking: 3 d. / drying on hot plate (apple-green less vivid than «vivid apple-green») / irradiated with gamma rays at 423.88 Mrad |
| milky chocolate-brown (yellow tone) | | |
| medium milky chocolate-brown (very light yellow reflection) | 7578 | mineral : chalcocite<br>rock : dark iron-grey (with localized turquoise oxidation)<br>powder : dark iron-grey<br>origin : Butte, Montana, United States<br><br>production process:<br>0↑1900 °F (dark iron-grey): 1 g + 80 ml nitric acid / soaking: 2 wk. / separation of the liquid and the solid / desiccation (colour of the liquid: dark green) / irradiated with gamma rays at 424.7 Mrad[81] |

| milky chocolate-brown (orange tone) | | |
|---|---|---|
| pale milky chocolate-brown (accentuated orange tone) | 7579 | mineral : fluorescent calcite<br>rock : white (localized grey or brown reflection), translucid<br>powder : white (yellow reflection)<br>origin : Bancroft, Ontario<br>production process:<br>(followed from «light milky chocolate-brown [orange reflection]»)<br>1000 °C / 1 h (light milky chocolate-brown [orange reflection]) / powder irradiated with gamma rays at 424.7 Mrad |
| pale milky chocolate-brown [with areas having «orange» and «grey» reflections] | 7580 | mineral : ochre[98]<br>powder : yellow<br>origin : small copper and nickel deposit, in the South-Western area of a mass of serpentinite at 3 km at the West of Saint-Fabien-de-Panet, Québec<br>production process:<br>(followed from «orange more pale than "orange"»)<br>2 g of ochre + 2 g of sodium carbonate / 0†1900 °F + 1 h at 1900 °F (orange [brown tone]) / irradiated with gamma[239] rays at 423.88 Mrad |
| milky chocolate-brown (orange reflection) more pale than «light milky orange chocolate-brown» | 7581 | mineral : fluorescent calcite<br>rock : white (localized grey or brown reflection), translucid<br>powder : white (yellow reflection)<br>origin : Bancroft, Ontario<br>production process:<br>1000 °C / 1 h (light milky chocolate-brown [orange reflection]) / powder irradiated with electrons at 302,831 rad[239] |
| light milky chocolate-brown (orange reflection) | 7582 | production process:<br>1000 °C / 1 h |
| milky chocolate-brown (orange | 7583 | production process:<br>1000 °C / 1 h (light milky chocolate-brown [orange reflection]) / powder irradiated with gamma rays |

| | | |
|---|---|---|
| reflection), much more intense than «light milky chocolate-brown (orange reflection)» | | at 64.7 Mrad<br><br>(followed at «pale milky chocolate-brown [accentuated orange tone]») |
| milky chocolate-brown (light orange tone), darker than «light milky chocolate-brown (light orange tone)» | 7584 | mineral : corundum<br>rock : medium grey<br>powder : light grey<br>origin : Transvaal, Africa<br><br>production process:<br>2 g of corundum + 2 g of sodium carbonate / 0↑1600 °F + 1 h at 1600 °F (chocolate-brown [light orange tone] lighter than «light chocolate-brown [orange tone]») / irradiated with electrons at 162,431 rad |
| milky chocolate-brown (light orange tone), lighter than «milky chocolate-brown (light orange tone)» | 7585 | mineral : magnetite<br>rock : dark grey, with metallic brilliance<br>powder : dark grey<br>origin : Fosse du Labrador, Québec<br><br>production process:<br>(followed from «milky chocolate-brown [grey tone]»)<br>2 g of magnetite + 2 g of sodium carbonate:<br>0↑1100 °F + 1 h at 1100 °F |
| ↓ | | |
| milky chocolate-brown still more light and orange | 7586 | 0↑1200 °F + 1 h at 1200 °F |
| ↓ | | |
| milky chocolate-brown still more light and orange | 7587 | 0↑1300 °F + 1 h at 1300 °F<br>(followed at «dark orange-brown») |
| | | mineral : cerite<br>rock : dark brownish grey<br>powder : light grey (light brown tone)<br>origin : Jamestown, Boulder county, Colorado, United States<br><br>production process:<br>(followed at «beige») |

1435

| | | |
|---|---|---|
| medium milky chocolate-brown (orange and grey reflections) | 7588 | 0↑1900 °F (medium brown): .60 g + 50 ml sulphuric acid / soaking: 2 wk. / drying on hot plate (white [light green reflection]) / irradiated with gamma rays at 424.7 Mrad |
| medium milky chocolate-brown (orange reflection) | 7589 | mineral : bauxite[92]<br>powder : pinkish beige, mat<br>origin : Alcan Company, French Guyana<br><br>mineral : pyrochlore[947]<br>powder : reddish brown<br>origin : De-Mix quarry, North side of Mont Saint-Hilaire, Rouville county, Québec<br><br><u>production process:</u><br>(followed from «cold pink more pale than "light pink"»)<br>.50 g of pyrochlore + .50 g of bauxite / 0↑1900 °F (light pink-chamois) / irradiated with gamma[239] rays at 424.7 Mrad |
| medium milky chocolate-brown (light orange tone) | 7590 | mineral : smaltite[25], variety of skutterudite<br>rock : dark iron-grey, with silver metallic brilliance<br>powder : dark grey<br>origin : Cobalt, Ontario<br><br><u>production process:</u><br>(followed from «beige-pink»)<br>3 g of smaltite + 80 ml sulphuric acid / soaking: 2 wk. / separation of the liquid and the solid / drying on hot plate (colour of the liquid: pink more acute than «light pink») / irradiated with gamma rays at 424.7 Mrad |
| medium milky chocolate-brown (very light orange tone) | 7591 | mineral : steatite<br>rock : cold light grey, slightly translucid<br>powder : light grey<br>origin : East Broughton, Québec<br><br><u>production process:</u><br>(followed from «orange-brown»)<br>0↑2200 °F (light orange-brown) / powder irradiated with gamma rays at 424.7 Mrad |
| | | mineral : iron sulphide - nickel[353]<br>rock : medium greyish green<br>powder : light grey (light green tone)<br>origin : small copper and nickel deposit, in the South-Western area of a mass of |

1436

| | | |
|---|---|---|
| medium milky chocolate-brown (light orange reflection) | 7592 | serpentinite at 3 km at the West of Saint-Fabien-de-Panet, Québec<br><br><u>production process:</u><br>(followed from «pink-chamois more pale than "medium pink-chamois"»)<br>0↑1300 °F (pink-beige a bit more accentuated than «pink-beige») / irradiated with gamma rays at 424.7 Mrad |
| medium milky chocolate-brown (orange tone) | 7593 | mineral : zincite<br>rock : mixture of areas: dark grey / orange-red<br>powder : medium milky chocolate-brown (red tone)<br>origin : Franklin, New Jersey, United States<br><br><u>production process:</u><br>0↑1000 °F<br>(followed at «milky chocolate-brown a bit darker than "medium milky chocolate-brown"») |
| milky chocolate-brown (orange tone) darker than «medium milky chocolate-brown (orange tone)» | 7594 | mineral : uraninite<br>rock : medium chocolate-brown (red Bordeau tone)<br>powder : medium milky chocolate-brown<br>origin : Yellowknife, Canada<br><br><u>production process:</u><br>(followed from «milky chocolate-brown darker than "medium milky chocolate-brown"»)<br>powder irradiated with gamma²²⁸ rays at 360 Mrad<br><br>(followed at «milky chocolate-brown a bit more pale than "dark milky chocolate-brown"») |
| milky chocolate-brown (very, very | 7595 | mineral : fluorescent calcite<br>rock : white (localized grey or brown reflection), translucid<br>powder : white (yellow reflection)<br>origin : Bancroft, Ontario<br><br>mineral : sulphur<br>rock : brilliant yellow<br>powder : brilliant yellow<br>origin : unknown<br><br><u>production process:</u><br>2 g of calcite + 2 g of sulphur / 1300 °F / 1 h (orange-chamois) / irradiated with gamma rays at |

1437

| | | |
|---|---|---|
| light orange reflection), [between «medium» and «dark» milky chocolate-brown (orange tone)] | | 424.7 Mrad[81] |
| dark milky chocolate-brown (orange tone) | 7596 | mineral : anorthosite<br>rock : dark grey<br>powder : medium grey<br>origin : Jonquière, Lac Saint-Jean, Québec<br><br>mineral : sulphur<br>rock : brilliant yellow<br>powder : brilliant yellow<br>origin : unknown<br><br>production process:<br>1 g of anorthosite + 1 g of sodium carbonate + 2 g of sulphur / 0↑1600 °F |
| dark and intense milky chocolate-brown (light orange tone) | 7597 | mineral : beryl<br>rock : light blue (near turquoise), slightly translucid<br>powder : light grey<br>origin : Lacorne district, Abitibi, Québec<br><br>mineral : sulphur<br>rock : brilliant yellow<br>powder : brilliant yellow<br>origin : unknown<br><br>production process:<br>(followed from «milky chocolate-brown a bit darker and pink than "light milky chocolate-brown [pink tone]"»)<br>2 g of beryl + 2 g of sulphur / 1300 °F / 1 h<br>light milky chocolate-brown [light grey tone]) / irradiated with gamma rays at 424.7 Mrad |
| dark milky cho- | 7598 | mineral : cryolite<br>rock : white, crystalline and translucid<br>powder : white<br>origin : Ivigtut, Groenland<br><br>production process:<br>(followed from «yellow»)<br>0↑1600 °F (white [with yellowish areas]): .20 g |

| | | |
|---|---|---|
| colate-brown (orange tone) | | + 50 ml hydrochloric acid / soakig: 2 wk. / drying on hot plate (very light yellow) / irradiated with gamma rays at 424.7 Mrad |
| dark milky chocolate-brown (orange reflection) | 7599 | mineral : peridotite<br>rock : medium grey<br>powder : medium brownish grey (green reflection)<br>origin : Thetford Mines, Québec<br><br>mineral : sulphur<br>rock : brilliant yellow<br>powder : brilliant yellow<br>origin : unknown<br><br>production process:<br>2 g of peridotite + 2 g of sulphur / 1300 °F / 1 h (red-orange [brown tone]) / irradiated with gamma rays at 424.7 Mrad[81,239] |
| dark milky chocolate-brown (light orange tone) | 7600 | mineral : pyrochlore[947]<br>powder : reddish brown<br>origin : De-Mix quarry, North side of Mont Saint-Hilaire, Rouville county, Québec<br><br>production process:<br>(followed from «light orange-beige»)<br>.40 g of pyrochlore + 50 ml sulphuric acid / soaking: 2 wk. / drying on hot plate (white [pinkish creamy reflection]) / irradiated with gamma rays at 424.7 Mrad |
| dark milky chocolate-brown (light orange tone) | 7601 | mineral : rutile<br>powder : dark brown (orange-red reflection)<br>origin : North Stradbroke Island, Queensland, Australia<br><br>production process:<br>(followed from «light orange-beige»)<br>.40 g of rutile + 50 ml sulphuric acid / soaking: 2 wk. / drying on hot plate (mixture of particles: white / brown) / irradiated with gamma rays at 430.4 Mrad |
| mixture of particles | | |
| | | mineral : apatite<br>rock : pale brownish green<br>powder : very light greyish green<br>origin : Black Lake, Thetford county, Québec |

| | | |
|---|---|---|
| medium milky chocolate-brown (very light orange tone) / dark chocolate-brown | 7602 | <u>production process:</u><br>(followed from «amber-orange darker than "amber-orange"»)<br>2 g of apatite + 25 ml hydrochloric acid / soaking: 24 h / drying on hot plate (orange) / irradiated with gamma[228] rays at 424.7 Mrad |
| milky chocolate-brown (pinkish orange tone) | | |
| pale milky chocolate-brown (light pinkish orange tone) | 7603 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Barraute, Abitibi, Québec<br><br>mineral : cement[1138]<br>powder : white<br><br><u>production process:</u><br>(followed from «dark greyish beige [light orange tone]»)<br>0↑1400 °F / slow cooling in furnace (indian red[107]): .10 g + 1.50 g of feldspar (medium brown [pinkish orange tone]): 1 g + 4.50 g of cement + 3 cc of water / manual grinding / moulding / hardening / 0↑1900 °F<br>(followed at «medium greyish brown [light pinkish orange tone]») |
| medium milky chocolate-brown (light pinkish orange tone) | 7604 | mineral : bauxite[92]<br>powder : pinkish beige, mat<br>origin : Alcan Company, French Guyana<br><u>production process:</u><br>(followed from «chamois-pink»)<br>0↑1500 °F (light pink-chamois) / irradiated with gamma rays at 424.7 Mrad<br>(followed at «dark chocolate-brown») |
| | | mineral : corundum<br>rock : medium grey<br>powder : light grey<br>origin : Transvaal, Africa<br><br>mineral : sulphur<br>rock : brilliant yellow<br>powder : brilliant yellow<br>origin : unknown |

| | | |
|---|---|---|
| medium milky chocolate-brown (pink-orange tone) | 7605 | production process:<br>(followed from «reddish brown»)<br>2 g of corundum + 2 g of sulphur / 1300 °F / 1 h (pale reddish beige) / irradiated with gamma rays at 424.7 Mrad |
| medium milky chocolate-brown (pink-orange tone) | 7606 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «medium milky chocolate-brown [orange tone]»)<br>2 g of goethite + 2 g of sodium carbonate + 2 g of titanium dioxide / 1600 °F / 1 h<br>(followed at «medium milky greyish chocolate-brown [pinkish orange tone]») |
| dark milky chocolate-brown (light pink-orange tone) | 7607 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white<br><br>production process:<br>(followed from «medium brownish beige [light pink tone]»)<br>0↑1400 °F / slow cooling in furnace (indian red[107]): .25 g + 1.50 g of feldspar (dark reddish brown): 1 g + 4.50 g of cement + 3 cc of water / manual grinding / moulding / hardening / 0↑1900 °F<br>(followed at «medium milky chocolate-brown [red tone]») |
| pinkish milky chocolate-brown | | |
| | | mineral : corundum<br>rock : medium grey<br>powder : light grey<br>origin : Transvaal, Africa |

| | | |
|---|---|---|
| light pinkish milky chocolate-brown | 7608 | <u>production process:</u><br>2 g of corundum + 2 g of sodium carbonate / 0↑1600 °F + 1 h at 1600 °F (chocolate-brown [light orange tone] lighter than «light chocolate-brown [orange tone]») / irradiated with gamma rays at 64.7 Mrad<br>(followed at «dark milky chocolate-brown [pink tone]») |
| light pinkish milky chocolate-brown | 7609 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white<br><u>production process:</u><br>(followed from «medium milky chocolate-brown [grey tone]»)<br>0↑1400 °F / slow cooling in furnace (indian red[107]): 1 g + 1.50 g of feldspar (medium brown [pinkish orange tone]): 1 g + 4.50 g of cement + 3 cc of water / manual grinding / moulding / hardening / 0↑1900 °F<br>(followed at «medium milky chocolate-brown [grey tone]») |
| light pinkish milky chocolate-brown | 7610 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : titanium dioxide<br>powder : white<br>origin : NL Chem Canada Inc., Québec<br><u>production process:</u><br>0↑1400 °F / slow cooling in furnace (indian red[107]): 1 g + 1 g of feldspar (dark reddish brown [tends towards Burgundy red]): .50 g + .50 g of sodium carbonate + .50 g of titanium dioxide / 1600 °F / 1 h |
| | | mineral : olivine |

1442

| | | |
|---|---|---|
| light milky chocolate-brown (light pink and grey tones) | 7611 | rock : light grey, crystalline<br>powder : very light grey<br>origin : Mont Albert, Gaspésie, Québec<br><br>production process:<br>(followed from «light beige»)<br>0↑1800 °F (reddish orange): 1 g + 50 ml sulphuric acid / soaking: 2 wk. / drying on hot plate (white [light cream reflection]) / irradiated with gamma rays[239] at 424.7 Mrad |
| light pinkish milky chocolate-brown | 7612 | mineral : sodalite<br>rock : indigo-blue, slightly translucid<br>powder : light grey (light blue tone)<br>origin : possibly Africa<br><br>mineral : sulphur<br>rock : brilliant yellow<br>powder : brilliant yellow<br>origin : unknown<br><br>production process:<br>1 g of sodalite + 1 g of sulphur / 1600 °F / 1 h |
| milky chocolate-brown a bit darker and pinkish than «light milky pinkish chocolate-brown» | 7613 | mineral : beryl<br>rock : light blue (near turquoise), slightly translucid<br>powder : light grey<br>origin : Lacorne district, Abitibi, Québec<br><br>mineral : sulphur<br>rock : brilliant yellow<br>powder : brilliant yellow<br>origin : unknown<br><br>production process:<br>2 g of beryl + 2 g of sulphur / 1300 °F / 1 h (light milky chocolate-brown [light grey tone]) / irradiated with gamma rays at 64.7 Mrad (followed at «dark and intense milky chocolate-brown [light orange tone]») |
| | | mineral : asbestos[4]<br>rock : dark grey (green reflection)<br>powder : light grey (green reflection)<br>origin : Asbestos Corporation Ltd., Thetford Mines, Québec<br><br>production process:<br>(followed at «brownish beige [orange reflection]») |

1443

| | | |
|---|---|---|
| medium milky pinkish chocolate-brown | 7614 | 2 g of asbestos + 2 g of sodium carbonate / 0↑1700 °F + 1 h at 1700 °F (orange-chamois) / irradited with gamma[239] rays at 550.22 Mrad |
| medium milky chocolate-brown (light pink tone) | 7615 | mineral : stibnite<br>rock : dark grey, with silver and blue metallic brilliance<br>powder : dark grey<br>origin : Consolidated Durham Mine, Saint-Georges, New Brunswick<br><br><u>production process:</u><br>(followed from «light beige»)<br>1 g of stibnite + 100 ml nitric acid / soaking: 2 wk. / separation of the liquid and the solid / drying on hot plate (colour of the liquid: white) / irradiated with gamma rays at 430.4 Mrad |
| medium milky chocolate-brown (light pink tone) | 7616 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br><u>production process:</u><br>(followed from «dark salmon [predominating orange tone]»)<br>5 g of asbestos + 100 ml sulphuric acid / soaking: 2 wk. / drying on hot plate (almost pure white [light yellow reflection]): 2 g + 2 g of sulphur / 1300 °F / 1 h (light orange clair, with brown tone [more brown than without sulphur]) / irradiated with gamma rays at 550.22 Mrad |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white |

| | | |
|---|---|---|
| medium milky chocolate-brown (pink tone) | 7617 | production process: (followed from «medium milky chocolate-brown [red tone]») 0↑1400 °F / slow cooling in furnace (indian red[107]): .50 g + 1 g of feldspar (dark reddish brown): 1 g + 4.50 g of cement + 3 cc of water / manual grinding / moulding / hardening / 0↑1900 °F (followed at «dark milky chocolate-brown») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br>production process:<br>1 g of goethite + 1 g of sulphur + 27.40 of cement + 13 cc of water / manual grinding / moulding / hardening: |
| medium pinkish milky chocolate-brown ↓ | 7618 | 0↑1300 °F |
| pinkish milky chocolate-brown a bit darker ↓ | 7619 | 0↑1500 °F |
| pinkish milky chocolate-brown identical to the previous one | 7620 | 0↑1700 °F (followed from «dark greyish beige [with brownish orange areas]») |
| dark pinkish milky chocolate-brown | 7621 | mineral : corundum<br>rock : medium grey<br>powder : light grey<br>origin : Transvaal, Africa<br><br>production process:<br>(followed from «light milky chocolate-brown [pink tone]»)<br>2 g of corundum + 2 g of sodium carbonate / 0↑1600 °F + 1 h at 1600 °F (chocolate-brown [light orange tone] lighter than «light chocolate-brown [orange tone]») / irradiated with gamma rays at 424.7 Mrad |

1445

| milky chocolate-brown (orange-pink tone) | | |
|---|---|---|
| milky chocolate-brown (orange-pink tone [between «light» and «medium» milky chocolate-brown (orange-pink tone)] | 7622 | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br><br>mineral : cement[1138]<br>powder : white<br><br><u>production process:</u><br>5 g of shale + 27.40 g of cement + 13 cc of water / manual grinding / moulding / hardening / 0↑1300 °F<br><br>(followed at «medium beige [pinkish orange tone]») |
| medium milky chocolate-brown (localized orange-pink reflection) | 7623 | mineral : zinc concentrate grilled at 1000 °C $(ZnO-FeO)(SO_4)$<br>powder : reddish brown<br>origin : Zinc Electrolytic du Canada Co., Québec<br><br><u>production process:</u><br>(followed from «light beige»)<br>4 g of concentrate + 100 ml sulphuric acid / soaking: 3 wk. / drying on hot plate (yellow lighter than «light yellow») / irradiated with gamma rays at 424.7 Mrad |
| medium milky chocolate-brown (orange-pink tone) | 7624 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : cement[1138]<br>powder : white<br><br><u>production process:</u><br>0↑1400 °F / slow cooling in furnace (indian red[107]): 1 g + 1 g of sulphur + 27.40 g of cement + 13 cc of water / manual grinding / moulding / |

| | | |
|---|---|---|
| | | hardening / 0↑1300 °F (followed at «violet-pink») |
| medium milky chocolate-brown (light orange-pink tone) | 7625 | mineral : smaltite[25], variety of skutterudite<br>rock : dark iron-grey, with silver metallic brilliance<br>powder : dark grey<br>origin : Cobalt, Ontario<br><br>production process:<br>(followed from «pink [red tone] much more accentuated than "very intense pink [red tone]"»)<br>0↑1900 °F (dark brown): .30 g + 50 ml sulphuric acid / soaking: 2 wk. / drying on hot plate (very intense pink [red tone]) / irradiated with gamma rays at 424.7 Mrad |
| dark milky chocolate-brown (very, very light orange-pink reflection) | 7626 | mineral : cobalt sulphide[597]<br>rock : dark grey, with silver metallic brilliance<br>powder : dark grey<br>origin : Cobalt, Ontario<br><br>production process:<br>(followed from «old rose»)<br>4 g of cobalt sulphide + 20 ml sulphuric acid / soaking: 24 h / drying on hot plate (medium old rose[601]) / irradiated with gamma rays at 424.7 Mrad |
| milky chocolate-brown (red tone) | | |
| medium milky chocolate-brown (red tone) | 7627 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white<br><br>production process:<br>(followed from «dark milky chocolate-brown [light pinkish orange tone]»)<br>0↑1400 °F / slow cooling in furnace (indian red[107]): .50 g + .50 g of feldspar (dark reddish brown): 1 g + 4.50 g of cement + 3 cc of water / manual grinding / moulding / hardening / 0↑1900 °F |

| | | |
|---|---|---|
| | | (followed at «medium milky chocolate-brown [pink tone]») |
| | | mineral : zincite<br>rock : mixture of areas: dark grey / orange-red<br>powder : medium milky chocolate-brown (red tone)<br>origin : Franklin, New Jersey, United States<br><br>production process: |
| dark milky chocolate-brown (red tone) | 7628 | powder irradiated with electrons at 164,800 rad |
| | | production process:<br>powder irradiated with gamma rays at: |
| medium milky chocolate-brown (red tone) | 7629 | 5 Mrad |
| which | 7630 | 57.4 Mrad |
| darkens | 7631 | 63.984 Mrad |
| | 7632 | 102.4 Mrad |
| | 7633 | 148.4 Mrad |
| | 7634 | 201.6 Mrad |
| considerably and the red tone be- | 7635 | 242.804 Mrad |
| comes more accentuated | 7636 | 247.6 Mrad |
| and then | 7637 | 287.3 Mrad |
| becomes | 7638 | 360 Mrad |
| dark milky chocolate-brown (red tone) | 7639 | 482.984 Mrad[948] |
| ↓<br>milky chocolate-brown (red tone) still darker | 7640 | 602.804 Mrad |
| milky chocolate-brown (grey tone) | | |
| | | mineral : calcite[11]<br>powder : white<br>origin : Calcite du Nord Co., Saint-Eugène de Mistassini, Lac Saint-Jean, Québec<br><br>mineral : chrome<br>powder : light grey, with metallic brilliance<br><br>production process: |
| pale milky chocolate-brown (grey | 7641 | 1 g of calcite + 1 g of chrome + 1 g of MgO / 1800 °F / 15 h (medium grass-green [light brown |

1448

| | | |
|---|---|---|
| tone) | | tone]) / irradiated with gamma rays at 360 Mrad |
| | | mineral : beryl<br>rock : light blue (near turquoise), slightly translucid<br>powder : light grey<br>origin : Lacorne district, Abitibi, Québec<br><br>mineral : sulphur<br>rock : brilliant yellow<br>powder : brilliant yellow<br>origin : unknown<br><br>production process:<br>2 g of beryl + 2 g of sulphur / 1300 °F / 1 h (light milky chocolate-brown [light grey tone]) / irradiated with electrons at: |
| milky chocolate-brown (light grey tone) a bit more pale than «light milky chocolate-brown (grey tone)»<br>↓ | 7642 | 162,431 rad |
| milky chocolate brown (light grey tone) still a bit more pale | 7643 | 302,831 rad[45] |
| light milky chocolate-brown (light grey tone) | 7644 | production process:<br>2 g of beryl + 2 g of sulphur / 1300 °F / 1 h |
| | | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «medium caput-mortuum [light pink tone]»)<br>.50 g of goethite + 1 g of titanium dioxide / |
| light milky chocolate-brown (grey tone)<br>↓ | 7645 | 0↑1700 °F |
| milky chocolate-brown (grey tone) | 7646 | 0↑1800 °F<br>(followed at «dark milky chocolate-brown») |

| | | |
|---|---|---|
| milky chocolate-brown (grey tone) | 7647 | mineral : magnetite<br>rock : dark grey, with metallic brilliance<br>powder : dark grey<br>origin : Fosse du Labrador, Québec<br><br>production process:<br>2 g of magnetite + 2 g of sodium carbonate / 0↑1000 °F + 1 h at 1000 °F<br>(followed at «milky chocolate-brown [light orange tone]») |
| milky chocolate-brown (grey tone) more pale than «medium milky chocolate-brown (grey tone)» | 7648 | mineral : fluorescent calcite<br>rock : white (localized grey or brown reflection), translucid<br>powder : white (yellow reflection)<br>origin : Bancroft, Ontario<br><br>production process:<br>1600 °F / 1 h (medium milky chocolate-brown [grey tone]) / rock irradiated with gamma rays at 65.65 Mrad<br><br>(followed at «medium beige») |
| medium milky chocolate-brown (grey tone) | 7649 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>(followed from «medium reddish brown»)<br>50 g of asbestos + 200 ml hydrochloric acid or asbestos entirely covered with hydrochloric acid / soaking: 1 wk. / drying on hot plate (vivid yellow): 3 g + 1 g of sodium carbonate + 1 g of sulphur / 1700 °F / 1 h |
| medium milky cho- | 7650 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «very, very light yellow»)<br>5 g of asbestos + 100 ml sulphuric acid / soaking: |

| | | |
|---|---|---|
| colate-brown (light grey tone) | | 2 wk. / drying on hot plate (almost pure white [light yellow reflection]) / irradiated with gamma rays at 550.22 Mrad |
| medium milky chocolate-brown (grey tone) | 7651 | mineral : andulusite<br>rock : light brownish grey<br>powder : light grey<br>origin : Bimbowrie, South Australia<br><br>production process:<br>(followed from «caramel-brown darker than "pale caramel-brown"»)<br>powder irradiated with gamma rays at 550.22 Mrad[949] |
| medium milky chocolate-brown (grey tone) | 7652 | mineral : anorthosite<br>rock : dark grey<br>powder : medium grey<br>origin : Jonquière, Lac Saint-Jean, Québec<br><br>production process:<br>0↑1900 °F (medium brown): .30 g + 50 ml sulphuric acid / soaking: 2 wk. / separation of the liquid and the solid / drying on hot plate (colour of the liquid: white) / irradiated with gamma rays at 424.7 Mrad[81] |
| medium milky chocolate-brown (grey tone) | 7653 | mineral : fluorescent calcite<br>rock : white (localized grey or brown reflection), translucid<br>powder : white (yellow reflection)<br>origin : Bancroft, Ontario<br><br>production process:<br>1600 °F / 1 h |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Barraute, Abitibi, Québec<br><br>mineral : cement[1138]<br>powder : white |

1451

| | | |
|---|---|---|
| medium milky chocolate-brown (grey tone) | 7654 | production process:<br>(followed from «dark milky chocolate-brown»)<br>0↑1400 °F / slow cooling in furnace (indian red[107]): 1 g + .50 g of feldspar (dark brownish red): 1 g + 4.50 g of cement + 3 cc of water / manual grinding / moulding / hardening / 0↑1900 °F (followed at «light milky chocolate-brown [pink tone]») |
| medium milky chocolate-brown (grey tone) | 7655 | production process:<br>(followed from «light milky chocolate-brown [pink tone]»)<br>0↑1400 °F / slow cooling in furnace (indian red[107]): 1.50 g + 1 g of feldspar (dark reddish brown): 1 g + 4.50 g of cement + 3 cc of water / manual grinding / moulding / hardening / 0↑1900 °F (followed at «medium greyish brown») |
| medium milky chocolate-brown (grey tone) | 7656 | mineral : hypersthene<br>rock : black<br>powder : medium brownish grey<br>origin : Lac Saint-Jean, Québec<br><br>production process:<br>(followed from «pinkish brown»)<br>2 g of hypersthene + 2 g of sodium carbonate / 0↑1600 °F + 15 min. at 1600 °F (dark brown) / irradiated with gamma rays at 424.7 Mrad |
| medium milky chocolate-brown (grey tone) | 7657 | mineral : uraninite<br>rock : medium chocolate-brown (red Bordeau tone)<br>powder : medium milky chocolate-brown<br>origin : Yellowknife, Canada<br><br>production process:<br>(followed from «dark mossy chocolate-brown»)<br>2 g of uraninite + 2 g of sodium carbonate / 0↑1500 °F + 15 min. at 1500 °F (mixture of particles: olive-green / medium brown) / irradiated with gamma rays at 424.7 Mrad |
| | | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «beige ochre [yellow tone]») |

| | | |
|---|---|---|
| medium milky chocolate-brown (light grey tone) | 7658 | 20 g of quartz - mica + 100 ml hydrochloric acid / soaking: 5 months / natural drying (light apple-green) / irradiated with gamma rays at 424.7 Mrad |
| medium milky chocolate-brown (grey tone) | 7659 | mineral : zincite<br>rock : mixture of areas: dark grey / orange-red<br>powder : medium milky chocolate-brown (red tone)<br>origin : Franklin, New Jersey, United States<br><br>production process:<br>(followed from «light beige»)<br>0↑1900 °F (black): .40 g + 50 ml sulphuric acid / soaking: 2 wk. / drying on hot plate (white [cream reflection]) / irradiated with gamma rays at 424.7 Mrad |
| dark milky chocolate-brown (grey tone) | 7660 | mineral : bloody agate<br>rock : dark grass-green, slightly translucid<br>powder : light grey (light green tone)<br>origin : India<br><br>production process:<br>rock hermetically wrapped in bread dough / 1600 °F / 1 h |
| dark milky chocolate-brown (grey tone) | 7661 | mineral : amazonite<br>rock : light greenish turquoise<br>powder : white (turquoise reflection)<br>origin : Lac Sairs, Témiscamingue, Québec<br><br>mineral : sulphur<br>rock : brilliant yellow<br>powder : brilliant yellow<br>origin : unknown<br><br>production process:<br>1 g of amazonite + 1 g of sulphur / 1600 °F / 1 h |
| dark milky choco- | 7661.1 | mineral : uraninite<br>rock : medium chocolate-brown (red Bordeau tone)<br>powder : medium milky chocolate-brown<br>origin : Yellowknife, Canada<br><br>production process:<br>1 g of uraninite + 5 g of pyrex / manual grinding |

| | | |
|---|---|---|
| late-brown (grey tone) | | heating: 5 °C per min. 0↑1245 °C + maintenance during 1 h / cooling: 5 °C per min. until ambient temperature is reached / the entity is done in ambient air |
| dark milky chocolate-brown (grey tone) | 7662 | mineral : barite<br>rock : pinkish white<br><br>powder : white<br>origin : Niobec Mine, Saint-Honoré, Saguenay, Québec<br><br>mineral : chromite<br>rock : blackish grey<br>powder : medium brownish grey<br>origin : Black Lake, near Thetford Mines, Québec<br><br>production process:<br>1.50 g of barite + .50 g of chromite / 0↑1900 °F |
| dark milky chocolate-brown (light grey tone) | 7663 | mineral : galena<br>rock : dark grey, with metallic brilliance<br>powder : dark grey, with metallic brilliance<br>origin : Trail, British Columbia<br><br>production process:<br>(followed from «brownish grey lighter than "medium brownish grey"») 20 g of galena + 100 ml sulphuric acid / soaking: 24 h / drying on hot plate (medium greyish brown) / irradiated with gamma[239] rays at 424.7 Mrad |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec |

| | | |
|---|---|---|
| dark milky chocolate-brown (grey tone) | 7664 | mineral : zirconium silicate<br>powder : white (very light yellow reflection)<br>origin : Sial Company, Québec<br><br>production process:<br>0↑1400 °F / slow cooling in furnace (indian red[107]): 1.50 g + 1.50 g of feldspar (dark reddish brown): .50 g + .50 g of sulphur + .50 g of titanium dioxide + .50 g of sodium carbonate + .50 g of zirconium silicate / deposited in a crucible closed with a cap / the entity is hermetically wrapped in bread dough / 1600 °F / 1 h |
| dark milky chocolate-brown (grey tone) | 7665 | mineral : idocrase<br>rock : yellowish green<br>powder : beige (green tone)<br>origin : Jeffrey Mine, Asbestos (presently J.-M. Asbestos), Québec<br><br>mineral : sulphur<br>rock : brilliant yellow<br>powder : brilliant yellow<br>origin : unknown<br><br>production process:<br>1 g of vesuvianite + 1 g of sulphur / 1600 °F / 1 h |
| milky chocolate-brown (grey tone) a bit darker than «dark milky chocolate-brown (grey tone)» | 7665.1 | mineral : uraninite<br>rock : medium chocolate-brown (red Bordeau tone)<br>powder : medium milky chocolate-brown<br>origin : Yellowknife, Canada<br><br>production process:<br>1 g of uraninite + 5 g of pyrex / manual grinding / heating: 5 °C per min. 0↑1245 °C + maintenance during 1 h / cooling: 5 °C per min. until ambient temperature is reached / the entity is done in ambient air (dark milky chocolate-brown [grey tone]) / irradiated with gamma rays at 9.88 Mrad |
| greyish milky chocolate-brown (lilac tone) | | |
| | | mineral : smaltite[25], variety of skutterudite<br>rock : dark iron-grey, with silver metallic brilliance<br>powder : dark grey<br>origin : Cobalt, Ontario |

| | | |
|---|---|---|
| medium milky chocolate-brown (lilac-grey tone) | 7666 | production process: (followed from «pink darker than "light pink"») 3 g of smaltite + 80 ml sulphuric acid / soaking: 2 wk. / separation of the liquid and the solid / drying on hot plate (colour of the solid: light pink) / irradiated with gamma rays at 424.7 Mrad |
| greyish milky chocolate-brown (orange tone) | | |
| medium greyish milky chocolate-brown (very, very light orange tone) | 7667 | mineral : actinolite<br>rock : light and cold evergreen<br>powder : light grey (light green tone)<br>origin : erratic block found at Saint-Philémon, near Dorchester, Québec<br><br>production process: (followed from «yellowish green much more intense, than "yellowish green"») 3 g of actinolite + 50 ml sulphuric acid / soaking: 2 wk. / drying on hot plate (light mint-green) / irradiated with gamma rays at 430.4 Mrad |
| medium greyish milky chocolate-brown (localized orange reflection) | 7668 | mineral : antigorite<br>rock : pale yellowish green<br>powder : very pale greenish yellow<br>origin : Canadian Refractories Mine, Kilmar, Québec<br><br>production process: (followed from «pinkish beige») 2 g of antigorite + 2 g of sodium carbonate / 0↑1500 °F + 1 h at 1500 °F (intense olive-green) / irradiated with gamma rays at 550.22 Mrad |
| medium greyish milky chocolate- | 7669 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process: (followed from «milky chocolate-brown darker than "dark milky chocolate-brown"») 1 g of goethite + 1 g of sodium carbonate + 2 g of titanium dioxide / 1600 °F / 1 h |

| | | |
|---|---|---|
| brown (orange tone) | | (followed from «medium milky chocolate-brown [pinkish orange tone]») |
| medium greyish milky chocolate-brown (light orange tone) | 7670 | mineral : tremolite<br>rock : medium brown (evergreen tone)<br>powder : greyish beige<br>origin : Tetreault Mine, Montauban, Portneuf county, Québec<br><br>production process:<br>0↑1900 °F (orange-beige): .30 g + 50 ml sulphuric acid / soaking: 2 wk. / drying on hot plate (light milky greyish chocolate-brown [light pink tone]) / irradiated with gamma rays at 424.7 Mrad[81] |
| dark greyish milky chocolate-brown (light orange tone) | 7671 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «dark grey [violet-pink tone]»)<br>1 g of goethite + 1 g of sodium carbonate + 1 g of sulphur + 1 g of zirconium silicate / 1700 °F / 1 h<br>(followed at «greyish brown darker than "dark greyish brown"») |
| dark greyish milky chocolate-brown (orange reflection) | 7672 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>(followed from «yellow [light green tone]»)<br>4 g of pentlandite + 80 ml nitric acid / soaking: 2 wk. / separation of the liquid and the solid / desiccation (colour of the solid: light yellow [light green tone]) / irradiated with gamma rays at 430.4 Mrad |
| | | mineral : yofortierite[87] |

| | | |
|---|---|---|
| dark greyish milky chocolate-brown (very light orange reflection) | 7673 | rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «medium chocolate-brown»)<br>1 g of yofortierite + 50 ml hydrochloric acid / soaking: 2 wk. / drying on hot plate (beige) / irradiated with gamma rays at 430.4 Mrad |
| greyish milky chocolate-brown (pinkish orange tone) | | |
| medium milky chocolate-brown (pinkish orange tone) | 7674 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «milky chocolate-brown [pinkish orange tone]»)<br>2 g of goethite + 2 g of sodium carbonate + 1 g of titanium dioxide / 1600 °F / 1 h |
| greyish milky chocolate-brown (pink tone) | | |
| greyish milky chocolate-brown (light pink tone) (a bit lighter than «light greyish milky chocolate-brown (light pink tone)» | 7675 | mineral : tremolite<br>rock : medium brown (evergreen tone)<br>powder : greyish beige<br>origin : Tetreault Mine, Montauban, Portneuf county, Québec<br>production process:<br>0↑1900 °F (orange-beige): .30 g + 50 ml sulphuric acid / soaking: 2 wk. / drying on hot plate (light milky greyish chocolate-brown [light pink tone]) / irradiated with electrons at 162,431 rad |
| light greyish milky chocolate-brown (light pink tone) | 7676 | production process:<br>0↑1900 °F (orange-beige): .30 g + 50 ml sulphuric acid / soaking: 2 wk. / drying on hot plate |

| | | |
|---|---|---|
| dark greyish milky chocolate-brown (pink tone) | 7677 | mineral : goethite[106]<br>powder : rusty orange<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «dark orange-beige»)<br>2 g of goethite + 1 g of sodium carbonate + 1 g of titanium dioxide / 1600 °F / 1 h<br>(followed at «milky chocolate-brown darker than "dark milky chocolate-brown"») |
| greyish milky chocolate-brown (orange-pink tone) | | |
| medium greyish milky chocolate-brown (orange-pink reflection) | 7678 | mineral : almandite<br>rock : dark brownish red<br>powder : medium brownish red<br>origin : Gore Mountain, Warren county, state of New York, United States<br><br>production process:<br>0↑1900 °F (dark iron-grey): .50 g + 50 ml sulphuric acid / soaking: 2 wk. / drying on hot plate (very light grey [light green tone]) / irradiated with gamma rays at 430.4 Mrad |
| chocolate-brown | | |
| chocolate-brown more pale [less orange] than «light chocolate-brown» | 7679 | mineral : chalcopyrite<br>powder : dark grey (light green tone)<br>origin : Centre de recherche des Mines Noranda in Montréal, Québec<br><br>production process:<br>4 g of chalcopyrite + 50 ml nitric acid / as soon as the mineral is put in the acid, the bubbling starts / separation of the liquid and solid immediately after the bubbling / the 2 rest separately during 1 wk. / natural drying (colour of the solid: light chocolate-brown) / irradiated with gamma rays at 64.7 Mrad<br>(followed at «mixture of particles: creamy yellow / dark beige») |
| light chocolate-brown | 7680 | production process:<br>(followed from «light apple-green [orange tone]»)<br>4 g of chalcopyrite + 50 ml nitric acid / starts bubbling as soon as the mineral is deposited in acid / separation of the liquid and solid immedia- |

1459

| | | |
|---|---|---|
| | | tely after the bubbling stops / the 2 rest separately during 1 wk. / natural drying / colour of solid |
| | | mineral : apatite<br>rock : reddish brown<br>powder : light pinkish beige<br>origin : Calumet, Pontiac county, Québec<br><br>production process:<br>rock irradiated with gamma rays at: |
| light chocolate-brown | 7681 | 5 Mrad |
| ↓ | 7682 | 65.704 Mrad |
| darker chocolate-brown | 7683 | 102.4 Mrad |
| ↓ | | |
| still darker chocolate-brown | 7684 | 201.6 Mrad[950] |
| ↓ | | |
| still darker chocolate-brown | 7685 | 244.53 Mrad[951]<br>(followed at «dark chocolate-brown») |
| | | mineral : corundum<br>rock : medium grey<br>powder : light grey<br>origin : Transvaal, Africa<br><br>production process: |
| light chocolate-brown | 7686 | 2 g of corundum + 2 g of sodium carbonate / 0↑1500 °F + 1 h at 1500 °F<br>(followed at «chocolate-brown [light orange tone] lighter than "light chocolate-brown [orange tone]"») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «medium brown») |
| light chocolate-brown<br>↓ | 7687 | 2 g of goethite + 24 g of sulphur / 400 °F / 1 h[952,953,954]<br><br>(followed at «brown [light red tone]» and «brown [light orange tone]»)<br><br>(followed from «rusty brown a bit more brown than "rusty brown"» and «chocolate-brown lighter than |

| | | |
|---|---|---|
| ↓<br>light chocolate-brown | 7688 | "chocolate-brown"»)<br><br>2 g of goethite + 12 g of sulphur / 800 °F / 1 h[952,953,954]<br>(followed at «chocolate-brown [very light red tone]» and «chocolate-brown [red tone]») |
| light chocolate-brown ↓ | 7689 | mineral : almandite<br>rock : dark brownish red<br>powder : medium brownish red<br>origin : Gore Mountain, Warren county, state of New York, United States<br><br>production process:<br>2 g of almandite + 2 g of sodium carbonate:<br>0↑1300 °F + 1 h at 1300 °F |
| darker chocolate-brown | 7690 | 0↑1400 °F + 1 h at 1400 °F<br>(followed at «brown [olive-green tone]») |
| light chocolate-brown | 7691 | mineral : pyrochlore[947]<br>powder : reddish brown<br>origin : De-Mix quarry, North side of Mont Saint-Hilaire, Rouville county, Québec<br><br>production process:<br>.40 g of pyrochlore + 50 ml nitric acid / soaking: 2 wk. / drying on hot plate |
| light chocolate-brown | 7692 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>(followed from «yellowish beige»)<br>0↑1200 °F<br>(followed at «medium chocolate-brown») |
| chocolate-brown | 7693 | mineral : tiger-eye agate<br>rock : orange with silky luster, opaque<br>powder : orange with silky luster<br>origin : Africa<br><br>production process:<br>3 g of agate + 40 ml phosphoric acid / soaking: 2 wk. / drying on hot plate (still humid) / colour of the solid[9,955] |

| | | |
|---|---|---|
| chocolate-brown | 7694 | mineral : crocidolite<br>rock : dark greyish blue<br>powder : pale greyish blue<br>origin : South Africa<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superimposed layers of colours, the one at the bottom being: dark green [light yellow tone]) / 500 °F / 1 h<br>(followed at «chamois-brown») |
| | | mineral : fluorescent calcite<br>rock : white (localized grey or brown reflection, translucid<br>powder : white (yellow reflection)<br>origin : Bancroft, Ontario<br><br>mineral : chromite[294]<br>rock : dark grey<br>powder : dark grey<br>origin : Black Lake, Eastern Townships, Québec<br><br>production process:<br>(followed from «dark khaki-brown [dark greenish brown]») |
| chocolate-brown<br>¦ | 7695 | 1.50 g of chromite + .25 g of calcite / 1000 °C / 2 h |
| darker chocolate-brown<br>↓ | 7696 | .50 g of chromite + .25 g of calcite / 1000 °C / 2 h |
| still darker chocolate-brown | 7697 | 1 g of chromite + .25 g of calcite / 1000 °C / 2 h |
| | | mineral : zinc concentrate grilled at 1000 °C ($ZnO$-$FeO$)($SO_4$)<br>powder : reddish brown<br>origin : Zinc Electrolytic du Canada Co., Québec<br><br>production process:<br>2 g of concentrate + 2 g of sodium carbonate: |
| chocolate-brown<br>¦ | 7698 | 0↑1200 °F + 1 h at 1200 °F |
| chocolate-brown<br>↓ | 7699 | 0↑1300 °F + 1 h at 1300 °F |
| chocolate-brown | 7700 | 0↑1400 °F + 1 h at 1400 °F<br>(followed at «rusty brown») |

| | | |
|---|---|---|
| | | mineral : goethite[106]<br>powder : rusty orange<br>origin : Red Mill, in the suburbs of Cap-de-la-Madeleine, Québec |
| | | mineral : sulphur<br>rock : brilliant yellow<br>powder : brilliant yellow<br>origin : unknown |
| | | production process:<br>(followed from «brown [light red tone]» and «medium brown») |
| chocolate-brown | 7701 | 2 g of goethite + 6 g of sulphur / 400 °F / 1 h[952,953,954] |
| lighter chocolate-brown | 7702 | 2 g of goethite + 12 g of sulphur / 500 °F / 1 h[952,953,954] |
| | | (followed at «brown [light orange tone]» and «light mossy chocolate-brown [ashen tone]») |
| | | (followed from «brown [light orange tone]» and «chocolate-brown» [above]) |
| chocolate-brown | 7703 | 2 g of goethite + 6 g of sulphur / 600 °F / 1 h[952,953,954] |
| | | (followed at «light mossy chocolate-brown [ashen tone]» and «dark chocolate-brown») |
| | | (followed from «dark chocolate-brown» and «light mossy chocolate-brown [ashen tone]») |
| lighter chocolate-brown | 7704 | 2 g of goethite + 12 g of sulphur / 700 °F / 1 h[952,953,954] |
| | | (followed at «light chocolate-brown») |
| | | (followed from «brown [very light orange tone]») |
| still lighter chocolate-brown | 7705 | 2 g of goethite + 24 g of sulphur / 700 °F / 1 h[952,953,954] |
| | | (followed at «rusty brown» and «chocolate-brown [very light red tone]»)<br>(followed from «chocolate-brown lighter than "medium chocolate-brown"» and «dark chocolate-brown») |
| chocolate-brown lighter than the previous «chocolate-brown» | 7706 | 2 g of goethite + 12 of sulphur / 1300 °F / 1 h[952,953,954] |
| | | (followed from «chocolate-brown lighter than "med- |

1463

| | | |
|---|---|---|
| ↓<br>still lighter chocolate-brown | 7707 | dium chocolate-brown"»)<br><br>2 g of goethite + 24 g of sulphur / 1300 °F / 1 h[952,953,954] |
| chocolate-brown<br>↓<br>chocolate-brown darker than «chocolate-brown» | 7708<br><br>7709 | mineral : olivine<br>rock : light grey, crystalline<br>powder : very light grey<br>origin : Mont Albert, Gaspésie, Québec<br><br>production process:<br>(followed from «medium brown [tends towards beige]»)<br>2 g of olivine + 2 g of sodium carbonate:<br>0↑1700 °F + 1 h at 1700 °F<br><br>0↑1800 °F + 1 h at 1800 °F<br>(followed at «dark chocolate-brown [grey tone]») |
| chocolate-brown | 7710 | mineral : iron pyrite<br>powder : greyish brown, with golden yellow metallic brilliance<br>origin : Rigaud seigniory, Beauce county, Québec<br><br>production process:<br>30 g of pyrite + 75 ml hydrochloric acid / soaking: 5 months / natural drying |
| chocolate-brown | 7711 | mineral : steatite<br>rock : light evergreen<br>powder : white<br>origin : East Broughton, Québec<br><br>production process:<br>0↑2200 °F (light brown): 2 g + 80 ml hydrochloric acid / soaking: 2 wk. / drying on hot plate |
| chocolate-brown a bit darker than «chocolate-brown» | 7712 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>powder irradiated with gamma rays at:<br>64.7 Mrad |

1464

| | | |
|---|---|---|
| ↓<br>chocolate-brown<br>still a bit darker | 7713 | 424.7 Mrad |
| medium chocolate-brown | 7714 | mineral : agate<br>rock : dark grass-green, slightly translucid<br>powder : light grey (light green tone)<br>origin : bank of Saint-Lawrence river, region of Maria, Gaspésie, Québec<br><br>production process:<br>(followed from «dark greenish grey»)<br>1 g of agate + 1 cc of synthetic white transparent enamel paint for the car / manual grinding / application on a piece of steel sheet used for the car's body measuring 1" x 1" (greenish grey) / irradiated with gamma rays at 201.6 Mrad<br>(followed at «dark greenish grey») |
| medium chocolate-brown | 7715 | mineral : asbestos[4]<br>rock : dark grey (green reflection)<br>powder : light grey (green reflection)<br>origin : Asbestos Corporation Ltd., Thetford Mines, Québec<br><br>production process:<br>(followed from «orange-cream»)<br>50 g of asbestos + 200 ml hydrochloric acid or asbestos entirely covered with hydrochloric acid / soaking: 1 wk. / drying on hot plate (vivid yellow): .50 g + .50 g of sodium carbonate (light and vivid orange [beige tone]) + 40 ml nitric acid / soaking: 5 d. / separation of the liquid and the solid / drying on sand bath (light orange) / irradiated with gamma rays at 424.7 Mrad |
| medium chocolate-brown | 7716 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>2 g of analcime + 2 g of sodium carbonate /<br>0↑1500 °F + 1 h at 1500 °F (light bluish green) / irradiated with electrons at 162,431 rad |

| | | |
|---|---|---|
| | | mineral : anorthosite<br>rock : dark grey<br>powder : medium grey<br>origin : Jonquière, Lac Saint-Jean, Québec<br><br>production process:<br>(followed from «brownish grey darker than "dark brownish grey"»)<br>rock irradiated with gamma rays at: |
| medium chocolate-brown | 7717 | 201.6 Mrad |
| darker chocolate-brown | 7718 | 247.6 Mrad |
| still darker chocolate-brown | 7719 | 287.3 Mrad |
| still darker chocolate-brown | 7720 | 360 Mrad<br>(followed at «very dark chocolate-brown, almost black») |
| | | mineral : anorthosite<br>rock : light grey<br>powder : very, very light greyish beige<br>origin : rang Sainte-Germaine, Oka, Québec<br><br>production process:<br>(followed from «light orange-brown»)<br>rock irradiated with gamma rays at: |
| medium chocolate-brown | 7721 | 201.6 Mrad |
| darker chocolate-brown | 7722 | 247.6 Mrad |
| still darker chocolate-brown | 7723 | 287.3 Mrad |
| still darker chocolate-brown | 7724 | 360 Mrad |
| still darker chocolate-brown | 7725 | 425.704 Mrad[956]<br>(followed at «dark chocolate-brown») |
| | | mineral : antigorite<br>rock : pale yellowish green<br>powder : very pale greenish yellow<br>origin : Canadian Refractories Mine, Kilmar, Québec<br><br>production process:<br>(followed from «caramel-brown [orange tone] darker |

| | | |
|---|---|---|
| medium chocolate-brown | 7726 | than "dark caramel-brown [orange tone]"») rock irradiated with gamma rays at 600.53 Mrad |
| medium chocolate-brown | 7727 | mineral : bornite<br>rock : reddish brown (with localized green and bluish green oxidation)<br>powder : reddish brown<br>origin : Lac Musset, Fosse du Labrador, Québec<br><br>production process:<br>(followed from «greenish beige darker than "pale greenish beige"»)<br>12 g of bornite + 40 ml nitric acid / soaking: 3 h / separation of the liquid (1st) and the solid / addition to the same solid of 40 ml nitric acid / soaking: 1 d. / separation of the liquid (2nd) and the solid / addition to the same solid of 40 ml nitric acid / soaking: 5 d. / separation of the liquid (3rd) and the solid / drying on sand bath (colour of the solid: pale greyish green [orange tone]) / the solid is irradiated with gamma rays at 424.7 Mrad |
| medium chocolate-brown | 7728 | mineral : chalcopyrite<br>powder : dark grey (light green tone)<br>origin : Centre de recherche des Mines Noranda in Montréal, Québec<br><br>production process:<br>4 g of chalcopyrite + 50 ml nitric acid / soaking: 3 d. / separation of the liquid and the solid / drying on sand bath / colour of the liquid[544] (followed at «light orange-brown») |
| | | mineral : chalcopyrite<br>rock : brass-yellow, with metallic luster<br>powder : dark grey (with golden particles)<br>origin : Noranda Mines, Noranda, Abitibi, Québec<br><br>production process:<br>(followed from «golden yellow [brown tone]»)<br>rock irradiated with gamma rays at: |
| medium chocolate-brown ↓ | 7729 | 201.6 Mrad |
| more accentuated chocolate-brown ↓ | 7730 | 247.6 Mrad |
| still more accen- | 7731 | 287.3 Mrad |

| | | |
|---|---|---|
| tuated chocolate-brown | | (followed at «dark chocolate-brown») |
| medium chocolate-brown | 7732 | <u>production process:</u><br>5 g of chalcopyrite + 20 ml hydrochloric acid / soaking: 3 d. / drying on hot plate |
| medium chocolate-brown | 7733 | mineral : chromite<br>rock : blackish grey<br>powder : medium brownish grey<br>origin : Black Lake, near Thetford Mines, Québec<br><br><u>production process:</u><br>0↑1900 °F<br>(followed at «dark chocolate-brown [light orange tone]») |
| medium chocolate-brown | 7734 | mineral : chromite<br>rock : blackish grey<br>powder : medium brownish grey<br>origin : Black Lake, near Thetford Mines, Québec<br><br>mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br><u>production process:</u><br>.50 g of chromite + 1.50 g of silica / 0↑2000 °F |
| medium chocolate-brown | 7735 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>2 g of fluorine + 20 ml phosphoric acid / soaking: 3 d. / drying on hot plate (still humid) / colour of the solid[30] |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland |

1468

| | | |
|---|---|---|
| medium chocolate-brown | 7736 | production process:<br>2 g of fluorine + 20 ml phosphoric acid / soaking: 3 d. / drying on hot plate (still humid) / colour of the solid[455] |
| medium chocolate-brown | 7737 | mineral : fluorine<br>rock : very light fluor-green (cold mint-green type), translucid<br>powder : very light grey<br>origin : Rogers Mine, Madoc, Ontario<br><br>production process:<br>(followed from «blue more intense than "bluish grey"»)<br>1 g of fluorine + 1 cc of synthetic white transparent enamel paint used for the car / manual grinding / application on a piece of steel sheet used for the car's body measuring 1" x 1" (light yellowish beige) / irradiated with gamma rays at 102.4 Mrad<br>(followed at «dark grey [light blue tone]») |
| medium chocolate-brown | 7738 | mineral : fluorine<br>rock : reddish violet, translucid<br>powder : very light grey<br>origin : Ohio, United States<br><br>production process:<br>(followed from «old rose [brown tone]»)<br>1 g of fluorine + 1 cc of synthetic white transparent enamel paint used for the car / manual grinding / application on a piece of steel sheet used for the car's body measuring 1" x 1" (greyish cream) / irradiated with gamma rays at 102.4 Mrad<br>(followed at «fairly dark greyish violet or violet-grey») |
| medium chocolate-brown | 7739 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «chocolate-brown [very light red tone]» and «rusty brown»)<br>2 g of goethite + 2 g of sulphur / 1000 °F / 1 h[952,953,954] |

| | | |
|---|---|---|
| | | (followed at «brown [light violet tone]»)<br><br>(followed from «rusty brown a bit more brown than "rusty brown"») |
| chocolate-brown lighter than «medium chocolate-brown» | 7740 | 2 g of goethite + 6 g of sulphur / 1000 °F / 1 h[952,953,954]<br><br>(followed at «chocolate-brown [red tone]»)<br><br>(followed from «brown [light violet tone]» and «chocolate-brown lighter than "medium chocolate-brown"») |
| medium chocolate-brown | 7741 | 2 g of goethite + 6 g of sulphur / 1200 °F / 1 h[952,953,954]<br><br>(followed at «dark chocolate-brown»)<br><br>(followed from «chocolate-brown [red tone]») |
| chocolate-brown lighter than «medium chocolate-brown» | 7742 | 2 g of goethite + 12 g of sulphur / 1200 °F / 1 h[952,953,954]<br><br>(followed at «chocolate-brown lighter than "chocolate-brown"»)<br><br>(followed from «chocolate-brown [red tone]») |
| chocolate-brown still lighter than «chocolate-brown lighter than "medium chocolate-brown"» | 7743 | 2 g of goethite + 24 g of sulphur / 1200 °F / 1 h[952,953,954]<br><br>(followed at «brown [light red tone]» and «chocolate-brown lighter than "chocolate-brown"») |
| | | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br><u>production process:</u><br>(followed from «reddish brown») |
| medium chocolate-brown | 7744 | 2 g of haematite + 2 g of sulphur / 500 °F / 1 h<br>(followed at «medium chocolate-brown [light red tone]») |
| | | mineral : hornblende<br>rock : medium evergreen (light grey tone), with a vitreous brilliance |

| | | |
|---|---|---|
| medium chocolate-brown | 7745 | powder : medium cold grey (light green tone)<br>origin : Abitibi, Québec<br><br><u>production process:</u><br>2000 °F / 45 min. |
| medium chocolate-brown | 7746 | mineral : hornblende<br>rock : medium evergreen (light grey tone), with a vitreous brilliance<br>powder : medium cold grey (light green tone)<br>origin : Abitibi, Québec<br><br>mineral : nickel<br>powder : dark brownish grey, with metallic brilliance<br><br><u>production process:</u><br>1 g of hornblende + 1 g of nickel / 2000 °F / 45 min.[958] |
| medium chocolate-brown | 7747 | mineral : ochre[20]<br>powder : orange<br>origin : small copper and nickel deposit, in the South-Western area of a mass of serpentinite at 3 km at the West of Saint-Fabien-de-Panet, Québec<br><br><u>production process:</u><br>15 g of ochre + 100 ml nitric acid / soaking: 24 h / drying on hot plate |
| medium chocolate-brown | 7748 | mineral : uraninite<br>rock : medium chocolate-brown (red Bordeau tone)<br>powder : medium milky chocolate-brown<br>origin : Yellowknife, Canada<br><br><u>production process:</u><br>(followed from «rusty brown a bit less dark than "medium rusty brown"»)<br>2 g of uraninite + 2 g of sodium carbonate / 0↑1300 °F + 1 h at 1300 °F (medium brown [light rusty tone]) / irradiated with gamma[239] rays at 424.7 Mrad |
| | | mineral : quartz<br>rock : light pink, translucid<br>powder : very light grey<br>origin : unknown<br><br>mineral : sulphur<br>rock : brilliant yellow |

| | | |
|---|---|---|
| medium chocolate-brown | 7749 | powder : brilliant yellow<br>origin : unknown<br><br><u>production process:</u><br>(followed from «light brown»)<br>1 g of quartz + 1 g of sulphur / 1700 °F / 1 h<br>(medium brownish grey) / irradiated with gamma[228]<br>rays at 425.65 Mrad |
| medium chocolate-brown | 7750 | mineral : serpentine<br>rock : yellowish green<br>powder : light greenish yellow<br>origin : probably Thetford Mines, Eastern Townships, Québec<br><br><u>production process:</u><br>1 g of serpentine + 1 g of chrome / 2000 °F /<br>45 min. |
| medium chocolate-brown | 7751 | mineral : steatite<br>rock : light evergreen<br>powder : white<br>origin : East Broughton, Québec<br><br><u>production process:</u><br>0↑2200 °F (light brown): 2 g + 80 ml nitric acid /<br>soaking: 2 wk. / drying on hot plate |
| | | mineral : pentlandite<br>rock : dark iron-grey, with silver and golden yellow metallic brilliance<br>powder : dark iron-grey (pronounced brown tone)<br>origin : Inco Co., Sudbury, Ontario<br><br><u>production process:</u><br>(followed from «brownish grey»)<br>rock irradiated with gamma rays at: |
| medium chocolate-brown ↓ | 7752 | 201.6 Mrad |
| chocolate-brown darker than «medium chocolate-brown» ↓ | 7753 | 247.6 Mrad |
| still darker chocolate-brown ↓ | 7754 | 287.3 Mrad |
| still darker chocolate-brown | 7755 | 360 Mrad[957]<br>(followed at «dark chocolate-brown») |

1472

| | | |
|---|---|---|
| medium chocolate-brown | 7756 | mineral : pyrite<br>rock : pale brass-yellow, with metallic brilliance<br>powder : brownish grey (with golden yellow particles)<br>origin : Noranda Mines, Noranda, Abitibi, Québec<br><br>production process:<br>(followed from «brownish grey darker than "dark brownish grey"»)<br>rock irradiated with gamma rays at 604.53 Mrad |
| | | mineral : nickeliferous pyrrhotite[23]<br>rock : dark iron-grey, with a silver and golden yellow metallic brilliance<br>powder : dark iron-grey<br>origin : Inco Co., Sudbury, Ontario<br><br>production process:<br>(followed from «brownish grey darker than "dark brownish grey"»)<br>rock irradiated with gamma rays at: |
| medium chocolate-brown ↓ | 7757 | 201.6 Mrad |
| darker chocolate-brown ↓ | 7758 | 247.6 Mrad |
| still darker chocolate-brown ↓ | 7759 | 287.3 Mrad |
| still darker chocolate-brown | 7760 | 360 Mrad[959,960]<br>(followed at «dark chocolate-brown») |
| medium chocolate-brown | 7761 | mineral : quartz-mica[96]<br>powder : light cream (light yellow tone)<br>origin : small copper and nickel deposit, in the South-Western area of a mass of serpentinite at 3 km at the West of Saint-Fabien-de-Panet, Québec<br><br>production process:<br>(followed from «dark pinkish brown»)<br>0↑2300 °F |
| | | mineral : quartz<br>rock : light pink, translucid<br>powder : very light grey<br>origin : unknown |

1473

| | | |
|---|---|---|
| medium chocolate-brown | 7762 | production process:<br>(followed from «chocolate-brown darker than "dark chocolate-brown"»)<br>rock irradiated with gamma rays at 424.7 Mrad[961] |
| medium chocolate-brown | 7763 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>(followed from «light chocolate-brown»)<br>0↑1300 °F<br>(followed at «dark chocolate-brown») |
| medium chocolate-brown | 7764 | mineral : sphalerite[27]<br>rock : dark grey, with golden yellow metallic brilliance<br>powder : dark brownish grey<br>origin : Matagami Mine, Matagami, Québec<br><br>production process:<br>0↑1800 °F |
| medium chocolate-brown | 7765 | mineral : stibnite<br>rock : dark grey, with metallic luster<br>powder : dark grey, with metallic luster<br>origin : Hunan, China<br><br>production process:<br>5 g of stibnite + 20 ml hydrochloric acid / soaking: 3 d. / drying on hot plate |
| medium chocolate-brown | 7766 | mineral : vesuvianite<br>rock : lilac, opaque<br>powder : lilac<br>origin : John Mansville Mine, Asbestos, Québec<br><br>production process:<br>(followed from «brownish beige»)<br>12 g of vesuvianite + 40 ml hydrochloric acid / soaking: 1 wk. / drying on sand bath (light yellowish beige) / irradiated with gamma[67,73] rays at 424.7 Mrad |
| | | mineral : yofortierite[87]<br>rock : dark chocolate-brown (with pinkish brown areas) |

1474

| | | |
|---|---|---|
| | | powder : dark chocolate-brown<br>origin : De-Mix quarry, North side of Mont Saint-Hilaire, Rouville county, Québec<br><br>production process: |
| medium chocolate-brown | 7767 | 1 g of yofortierite + 50 ml hydrochloric acid / soaking: 2 wk. / drying on hot plate (beige) / irradiated with gamma rays at 70.4 Mrad (followed at «dark greyish milky chocolate-brown [very light orange reflection]») |
| | | mineral : zincite<br>rock : mixture of areas: dark grey / orange-red<br>powder : medium milky chocolate-brown<br>origin : Franklin, New Jersey, United States<br><br>production process:<br>(followed from «milky chocolate-brown a bit more dark than "medium milky chocolate-brown"») |
| medium chocolate-brown ↓ | 7768 | 0↑1400 °F |
| darker and more brown «chocolate-brown» | 7769 | 0↑1500 °F<br><br>(followed at «dark chocolate-brown») |
| | | mineral : zircon<br>rock : grey and brown<br>origin : Mont Saint-Hilaire, Québec<br><br>production process:<br>(followed from «2 areas of the rock: brown / grey») |
| medium chocolate-moyen | 7770 | irradiated with gamma rays at 148.4 Mrad<br>(followed at «dark chocolate-brown») |
| | | mineral : bauxite[92]<br>powder : pinkish beige, mat<br>origin : Alcan Company, French Guyana<br><br>production process: |
| medium chocolate-brown | 7770.1 | 1 g of bauxite + 6.50 g of glass powder (spruce pine batch) / manual grinding / deposited on a ceramic plate at the state of a biscuit / heating in a furnace 0↑1000 °C in ambient air / slow cooling in furnace (medium greyish beige) / irradiated with gamma rays at 9.88 Mrad |
| | | mineral : fluorine<br>rock : pinkish lilac, opaque<br>powder : very light grey (lilac tone), almost |

| | | |
|---|---|---|
| | | white<br>origin : Saint-Lawrence Fluorspar Company, Saint-Lawrence, Newfoundland<br><br>production process:<br>(followed from «medium pinkish brown»)<br>1 g of fluorine + 1 cc of synthetic white transparent enamel paint used for the car[94] / manual grinding / application on a piece of steel sheet used for the car's body measuring 1" x 1" (medium beige) / irradiated with gamma rays at 102.4 Mrad[351,352]<br>(followed at «violet-grey darker than "medium violet-grey"») |
| chocolate-brown a bit darker than «medium chocolate-brown» | 7771 | |
| | | mineral : cerite<br>rock : dark brownish grey<br>powder : light grey (light brown tone)<br>origin : Jamestown, Boulder county, Colorado, United States<br><br>production process:<br>(followed from «brown much darker than "medium brown"»)<br>0↑2000 °F (medium brown) / powder irradiated with gamma[239] rays at 424.7 Mrad |
| chocolate-brown much darker than «medium chocolate-brown» | 7772 | |
| | | mineral : chromite<br>rock : blackish grey<br>powder : medium brownish grey<br>origin : Black Lake, near Thetford Mines, Québec<br><br>production process:<br>0↑1900 °F (medium chocolate-brown) / powder irradiated with gamma[239] rays at 64.7 Mrad<br>(followed at «dark chocolate-brown») |
| chocolate-brown much darker than «medium chocolate-brown» | 7773 | |
| | | mineral : iron pyrite<br>powder : greyish brown, with golden yellow metallic brilliance<br>origin : Rigaud seigniory, Beauce county, Québec<br><br>production process:<br>2 g of pyrite + 2 g of sodium carbonate / 0↑1500 °F + 1 h at 1500 °F (dark chocolate-brown) / irradiated with gamma[239] rays at 424.7 Mrad[81] |
| chocolate-brown a bit more pale than «dark chocolate-brown» | 7774 | |

1476

| | | |
|---|---|---|
| chocolate-brown more pale than «dark chocolate-brown» | 7775 | mineral : ochre[111]<br>powder : dark reddish brown<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «dark chocolate-brown [grey tone]»)<br>1 g of ochre + 1 g of zirconium silicate + 1 g of sulphur / 0↑1000 °F<br>(followed at «medium chocolate-brown [pink tone]») |
| chocolate-brown a bit lighter than «dark chocolate-brown» | 7776 | mineral : shale (formation of Sillery)[359]<br>rock : brownish red<br>powder : pinkish brown, mat<br>origin : bank of Saint-Lawrence river at Berthier-Sur-Mer, at the rear of the Dénechaud manor, Québec<br><br>production process:<br>50 g of shale + 100 ml phosphoric acid / soaking: 3 wk. / drying on hot plate [still humid] (colour of the solid: dark chocolate-brown) / irradiated with gamma[228] rays at 63.88 Mrad |
| dark chocolate-brown | 7777 | mineral : Gaspé agate<br>rock : marbled nodule with shaded tints of white, pink and light grey, slightly translucid<br>powder : very light pinkish grey<br>origin : Mont Lyall, Gaspésie, Québec<br><br>mineral : sulphur<br>rock : brilliant yellow<br>powder : brilliant yellow<br>origin : unknown<br><br>production process:<br>1 g of agate + 1 g of sulphur / 1600 °F / 1 h |
| | | mineral : albite<br>rock : colourless (pink reflection) |

| | | |
|---|---|---|
| | | origin : De-Mix quarry, North side of Mont Saint-Hilaire, Rouville county, Québec<br><br>production process:<br>rock entirely covered with 20 ml hydrochloric acid / soaking: 2 wk. / irradiated with gamma rays at 5.7 Mrad / drying on sand bath, completed on hot plate |
| dark chocolate-brown | 7778 | |
| | | mineral : crocidolite<br>rock : dark greyish blue<br>powder : pale greyish blue<br>origin : South Africa<br><br>mineral : sulphur<br>rock : brilliant yellow<br>powder : brilliant yellow<br>origin : unknown<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superimposed layers of colours, the one at the surface being «dark green [mint-green type]»): 2 g + 2 g of sulphur / 1500 °F / 1 h (medium reddish brown [light violet tone]) / irradiated with gamma[239] rays at 550.22 Mrad[535] |
| dark chocolate-brown | 7779 | |
| | | mineral : anorthosite<br>rock : light grey<br>powder : very, very light greyish beige<br>origin : rang Sainte-Germaine, Oka, Québec<br><br>production process:<br>(followed from «chocolate-brown darker than "medium chocolate-brown"»)<br>rock irradiated with gamma rays[962] at 604.53 Mrad |
| dark chocolate-brown | 7780 | |
| | | mineral : apatite<br>rock : reddish brown<br>powder : light pinkish beige<br>origin : Calumet, Pontiac county, Québec<br><br>production process:<br>(followed from «chocolate-brown darker than "light chocolate-brown"»)<br>rock irradiated with gamma rays at:<br>247.6 Mrad[133] |
| dark chocolate- | 7781 | |

| | | |
|---|---|---|
| brown ↓<br><br>darker and more accentuated chocolate-brown<br>↓<br>still darker chocolate-brown | <br><br>7782<br><br><br><br>7783 | <br><br>287.3 Mrad<br><br><br><br>360 Mrad<br>(followed at «chocolate-brown darker than "dark chocolate-brown"») |
| <br><br><br><br><br><br><br><br>dark chocolate-brown ↓<br><br>dark chocolate-brown | <br><br><br><br><br><br><br><br>7784<br><br><br>7785 | mineral : apatite<br>rock : medium brownish red<br>powder : light pinkish beige<br>origin : Ile Calumet, Pontiac county, Québec<br><br>production process:<br>(followed from «medium pinkish brown»)<br>rock irradiated with gamma rays at:<br>287.3 Mrad<br><br><br>360 Mrad<br>(followed at «black») |
| <br><br><br><br><br><br><br>dark chocolate-brown | <br><br><br><br><br><br><br>7786 | mineral : bauxite<br>powder : pinkish beige, mat<br>origin : Alcan Company, French Guyana<br><br>production process:<br>(followed from «medium milky chocolate-brown [light pinkish orange tone]»)<br>0↑1700 °F (light chamois) / irradiated with gamma rays at 424.7 Mrad |
| <br><br><br><br><br><br><br><br><br><br><br><br><br>dark chocolate-brown | <br><br><br><br><br><br><br><br><br><br><br><br><br>7787 | mineral : beryl<br>rock : intense grass-green, slightly translucid<br>powder : greenish grey<br>origin : unknown<br><br>mineral : sulphur<br>rock : brilliant yellow<br>powder : brilliant yellow<br>origin : unknown<br><br>production process:<br>1 g of beryl + 1 g of sulphur / 1600 °F / 1 h |
| | 7788 | mineral : limestone<br>rock : medium grey<br>origin : region of Montréal, Québec |

| | | |
|---|---|---|
| dark chocolate-brown | 7789 | production process:<br>(followed from «grey much darker than "medium grey"»)<br>rock irradiated with gamma rays at 482.984 Mrad |
| | 7790 | mineral : limestone<br>rock : dark grey<br>origin : region of Montréal, Québec |
| dark chocolate-brown | 7791 | production process:<br>(followed from «grey darker than "dark grey"»)<br>rock irradiated with gamma rays at 482.984 Mrad |
| dark chocolate-brown | 7792 | mineral : calcite<br>rock : light pink<br>powder : pinkish white<br>origin : Huddersfield district, Pontiac county, Québec<br><br>production process:<br>0↑1800 ºF (medium brownish grey): 2 g + 10 ml phosphoric acid / soaking: 4 years / drying on hot plate (still humid)[964] |
| dark chocolate-brown | 7793 | mineral : calcite<br>rock : light pink<br>powder : pinkish white<br>origin : Huddersfield district, Pontiac county, Québec<br><br>mineral : sulphur<br>rock : brilliant yellow<br>powder : brilliant yellow<br>origin : unknown<br><br>production process:<br>2 g of calcite + 2 g of sulphur / 1300 ºF / 1 h |
| dark chocolate-brown | 7794 | mineral : cerite<br>rock : dark brownish grey<br>powder : light grey (light brown tone)<br>origin : Jamestown, Boulder county, Colorado, United States<br><br>production process:<br>(followed from «brownish grey»)<br>rock irradiated with gamma rays at 482.984 Mrad |
| | | mineral : chalcocite |

| | | |
|---|---|---|
| | | rock : dark iron-grey (with localized turquoise oxidation)<br>powder : dark iron-grey<br>origin : Butte, Montana, United States<br><br>mineral : sulphur<br>rock : brilliant yellow<br>powder : brilliant yellow<br>origin : unknown<br><br>production process: |
| dark chocolate-brown | 7795 | 2 g of chalcocite + 2 g of sulphur / 1300 °F / 1 h (followed at «dark iron-grey») |
| dark chocolate-brown ↓ | 7796 | production process:<br>2 g of chalcocite + 2 g of sodium carbonate:<br>0↑1400 °F + 1 h at 1400 °F |
| dark chocolate-brown | 7797 | 0↑1500 °F + 1 h at 1500 °F<br>(followed at «mixture of particles: beige / brown») |
| | | mineral : chalcopyrite<br>rock : brass-yellow, with metallic brilliance<br>powder : dark grey (with golden particles)<br>origin : Noranda Mines, Noranda, Abitibi, Québec<br><br>production process:<br>(followed from «chocolate-brown more accentuated than "medium chocolate-brown"»)<br>rock irradiated with gamma rays at: |
| dark chocolate-brown ↓ | 7798 | 360 Mrad |
| still darker chocolate-brown | 7799 | 482.984 Mrad[965] |
| dark chocolate-brown [with vivid yellowish orange areas] | 7799.1 | production process:<br>1 g of chalcopyrite + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : chromite[294]<br>rock : dark grey<br>powder : dark grey<br>origin : Black Lake, Eastern Townships, Québec |

| | | |
|---|---|---|
| dark chocolate-brown | 7800 | <u>production process:</u><br>1300 °F / 1 h |
| dark chocolate-brown | 7801 | <u>production process:</u><br>0↑1000 °C |
| dark chocolate-brown | 7802 | mineral : chromite[294]<br>rock : dark grey<br>powder : dark grey<br>origin : Black Lake, Eastern Townships, Québec<br><br>mineral : sulphur<br>rock : brilliant yellow<br>powder : brilliant yellow<br>origin : unknown<br><br><u>production process:</u><br>2 g of chromite + 2 g of sulphur / 1300 °F / 1 h[966] |
| dark chocolate-brown | 7803 | mineral : chromite<br>rock : blackish grey<br>powder : medium brownish grey<br>origin : Black Lake, near Thetford Mines, Québec<br><br><u>production process:</u><br>0↑1900 °F (medium chocolate-brown): 1 g + 50 ml nitric acid / soaking: 2 wk. / drying on hot plate (medium milky chocolate-brown) / irradiated with gamma[239] rays at 424.7 Mrad[81] |
| dark chocolate-brown | 7804 | <u>production process:</u><br>(followed from «brownish grey darker than "medium brownish grey"»)<br>rock irradiated with gamma[228] rays at 482.984 Mrad |
| dark chocolate-brown | 7805 | <u>production process:</u><br>(followed from «chocolate-brown much darker than "medium chocolate-brown"»)<br>0↑1900 °F (medium chocolate-brown) / powder irradiated with gamma[239] rays at 424.7 Mrad |
| | | mineral : corundum<br>rock : medium grey<br>powder : light grey<br>origin : Transvaal, Africa<br><br><u>production process:</u><br>(followed from «greyish brown darker [brown] than |

| | | |
|---|---|---|
| | | "greyish brown"») <br> rock irradiated with gamma rays at: |
| dark chocolate-brown ↓ | 7806 | 360 Mrad |
| dark chocolate-brown | 7807 | 482.984 Mrad |
| dark chocolate-brown | 7808 | mineral : epidote <br> rock : green (light brown tone [olive-green type]) <br> powder : grey (greenish brown tone) <br> origin : Deloro Road, Madoc, Ontario <br><br> <u>production process:</u> <br> (followed from «olive-green [between «dark olive-green" and "dark chocolate-brown"]») <br> rock irradiated with gamma[228] rays at 424.7 Mrad |
| dark chocolate-brown | 7809 | mineral : solid epidote <br> rock : brownish green <br> powder : brownish green <br> origin : James Bay, Québec <br><br> <u>production process:</u> <br> 12 g of epidote + 40 ml hydrochloric acid / soaking: 14 d. / separation of the liquid and the solid / natural drying (colour of the liquid: vivid egg yolk yellow) / irradiated with gamma rays at 425.65 Mrad |
| | | mineral : galena <br> rock : dark grey, with metallic brilliance <br> powder : dark grey, with metallic brilliance <br> origin : Trail, British Columbia <br><br> mineral : cement[1138] <br> powder : white <br><br> <u>production process:</u> <br> (followed from «orange-brown [green tone] / yellow / orange») <br> 27.40 g of cement + 13 cc of water / manual grinding / moulding / 1 g of galena powder is immediately deposited at the surface of the humid cement / hardening / addition of 5 g of galena[967] at the surface of the dried cement: |
| dark chocolate-brown ↓ | 7810 | 0↑1650 °F[280] |
| darker chocolate-brown | 7811 | 0↑1700 °F[280,969] |

1483

| | | |
|---|---|---|
| still darker chocolate-brown ↓ | 7812 | 0↑1750 °F[280,970] |
| still darker chocolate-brown | 7813 | 0↑1800 °F[280] (followed at «green / yellow / orange / dark chocolate-brown») |
| | | production process: (followed from «orange-brown [green tone] / yellow / orange») 1 g of galena[968] powder is integrated to the mass of 27.40 g of cement + 13 cc of water / manual grinding / moulding / hardening / addition of 5 g of galena at the surface of the dried cement: |
| dark chocolate-brown ↓ | 7814 | 0↑1650 °F[280] |
| dark chocolate-brown ↓ | 7815 | 0↑1700 °F[280] |
| darker chocolate-brown ↓ | 7816 | 0↑1750 °F[280] |
| still darker chocolate-brown ↓ | 7817 | 0↑1800 °F[280] |
| still darker chocolate-brown ↓ | 7818 | 0↑1900 °F[280] |
| still darker chocolate-brown | 7819 | 0↑1950 °F[280] |
| dark chocolate-brown | 7820 | production process: 4 g of galena powder are deposited on a piece of stainless steel sheet and heated 2000 °F / 45 min.[280] |
| dark chocolate-brown | 7821 | production process: 4 g of galena powder are deposited on a piece of stainless steel sheet and heated at 1900 °F / 1 h[280] |
| | | mineral : galena<br>rock : dark grey, with metallic brilliance<br>powder : dark grey, with metallic brilliance<br>origin : Trail, British Columbia<br><br>mineral : chrome<br>powder : light grey, with metallic brilliance |

| | | |
|---|---|---|
| dark chocolate-brown | 7822 | production process:<br>.75 g of galena powder + .25 g of chrome are grinded and deposited on a piece of stainless steel sheet and heated at 2000 °F / 45 min.[280] |
| dark chocolate-brown | 7823 | mineral : galena<br>rock : dark grey, with metallic brilliance<br>powder : dark grey, with metallic brilliance<br>origin : Trail, British Columbia<br><br>mineral : nickel<br>powder : dark brownish grey, with metallic brilliance<br><br>production process:<br>.75 g of galena powder + .25 g of nickel are grinded and deposited on a piece of stainless steel sheet/heated at 2000 °F / 45 min.[280] |
| dark chocolate-brown | 7824 | mineral : biotite gneiss<br>rock : blackish grey, golden vitreous brilliance<br>powder : dark grey<br>origin : Grenville geological province, Québec<br><br>production process:<br>(followed at «dark orange-brown»)<br>12 g of gneiss + 40 ml hydrochloric acid / soaking: 22 d. / separation of the liquid and the solid / natural drying (colour of the solid: yellowish green) / irradiated with gamma rays at 424.7 Mrad |
| dark chocolate-brown | 7825 | production process:<br>12 g of gneiss + 40 ml hydrochloric acid / soaking: 22 d. / separation of the liquid and the solid / natural drying (colour of the liquid: dark yellowish green) / irradiated with gamma[67] rays at 424.7 Mrad |
| dark chocolate-brown | 7826 | mineral : granite gneiss<br>rock : reddish beige<br>powder : medium pink (light brown tone)<br>origin : Lac Beauport, region of the city of Québec, Québec<br><br>production process:<br>0↑1900 °F (medium beige): 1 g + 50 ml hydrochloric acid / soaking: 2 wk. / drying on hot plate (rusty orange) / irradiated with gamma rays at 430.4 Mrad[538] |
| | | mineral : goethite[106]<br>powder : rusty orange |

| | | |
|---|---|---|
| | | origin : Red Mill, in the suburbs of Cap-de-la -Madeleine, Québec<br><br>mineral : zirconium silicate<br>powder : white (very light yellow reflection)<br>origin : Sial Company, Québec<br><br><u>production process:</u><br>(followed from «caput-mortuum [violet-red tone] a bit more accentuated and red than "medium caput-mortuum [violet-red tone]"»)<br>.50 g of goethite + .50 g of zirconium silicate (whitened rusty orange) / 1600 °F / 1 h (medium caput-mortuum [violet-red tone]) / irradiated with gamma[228] rays at 424.7 Mrad<br>(followed at «caput-mortuum much darker than "accentuated caput-mortuum"») |
| dark chocolate-brown | 7827 | |
| dark chocolate-brown | 7828 | mineral : goethite[106]<br>powder : rusty orange<br>origin : Red Mill, in the suburbs of Cap-de-la -Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u><br>(followed from «rusty orange lighter than "medium rusty orange"»)<br>1 g of goethite + 1 g of zirconium silicate + 1 g of titanium dioxide / 1600 °F / 1 h (medium and vivid reddish orange): .15 g + 40 ml hydrochloric acid / natural drying (medium rusty orange) / irradiated with gamma rays at 425.65 Mrad |
| | | mineral : goethite[106]<br>powder : rusty orange<br>origin : Red Mill, in the suburbs of Cap-de-la -Madeleine, Québec<br><br>mineral : sulphur<br>rock : brilliant yellow<br>powder : brilliant yellow<br>origin : unknown<br><br><u>production process:</u><br>(followed from «blackish brown») |

| | | |
|---|---|---|
| dark chocolate-brown | 7829 | 1 g of goethite + 3 g of sodium carbonate + 1 g of sulphur / 1600 °F / 1 h (blackish green) / irradiated with gamma rays at 425.65 Mrad[228] |
| | | <u>production process:</u><br>(followed from «rusty brown» and «chocolate-brown lighter than "chocolate-brown"») |
| dark chocolate-brown | 7830 | 2 g of goethite + 6 g of sulphur / 700 °F / 1 h<br><br>(followed at «chocolate-brown lighter than "chocolate-brown"» and «rusty brown a bit more brown than "rusty brown"»)<br><br>(followed from «brown [light red tone]») |
| ↓ dark chocolate-brown | 7831 | 2 g of goethite + 6 g of sulphur / 1300 °F / 1 h (followed at «chocolate-brown lighter than "chocolate-brown"») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : feldspar<br>rock : white, opaque<br>powder : white<br>origin : Baraute, Abitibi, Québec<br><br>mineral : titanium dioxide<br>powder : white<br>origin : NL Chem Canada Inc., Québec<br><br><u>production process:</u><br>(followed from «dark orange-beige») |
| dark chocolate-brown | 7832 | 0↑1400 °F /slow cooling in furnace (indian red[107]): 1.50 g + 1.50 g of feldspar (dark reddish brown): .50 g + .50 g of sulphur + .50 g of titanium dioxide + .50 g of sodium carbonate / deposited in a crucible closed with a cap / the entity is hermetically wrapped in bread dough / 1600 °F / 1 h |
| | | mineral : goethite[106]<br>powder : rusty orange<br>origin : Red Mill, in the suburbs of Cap-de-la-Madeleine, Québec |

| | | |
|---|---|---|
| dark chocolate-brown | 7833 | mineral : zirconium silicate<br>powder : white (very light yellow reflection)<br>origin : Sial Company, Québec<br><br>production process:<br>(followed from «rusty brown»)<br>1 g of goethite + 1 g of zirconium silicate (whitened rusty orange) / irradiated with gamma rays at 360 Mrad |
| dark chocolate-brown ↓ | 7834 | mineral : almandite<br>rock : dark brownish red<br>powder : medium brownish red<br>origin : Gore Mountain, Warren county, state of New York, United States<br><br>production process:<br>(followed from «olive-green [brown tone]»)<br>2 g of almandite + 2 g of sodium carbonate:<br>0↑1600 °F + 1 h at 1600 °F[971] |
| dark chocolate-brown | 7835 | 0↑1700 °F + 1 h at 1700 °F<br>(followed at «blackish brown») |
| dark chocolate-brown | 7836 | mineral : honey grossular garnet<br>rock : light pinkish beige<br>powder : very light beige<br>origin : Jeffrey Mine, Asbestos (presently J.-M. Asbestos), Québec<br><br>mineral : sulphur<br>rock : brilliant yellow<br>powder : brilliant yellow<br>origin : unknown<br><br>production process:<br>1 g of garnet + 1 g of sulphur / 1600 °F / 1 h |
| dark chocolate-brown | 7837 | mineral : sandstone<br>rock : medium pinkish brown (light violet tone)<br>powder : medium pinkish brown (light violet tone)<br>origin : at the rear of Percé, Gaspésie, Québec<br><br>production process:<br>rock irradiated with gamma rays at 602.804 Mrad[509,972] |
| | | mineral : halite[41] |

| | | |
|---|---|---|
| | | rock : colourless<br>powder : colourless<br>origin : Seleine Mine, Iles-de-la-Madeleine, Québec |
| | | <u>production process:</u><br>(followed from «reddish brown»)<br>rock irradiated with gamma rays at: |
| dark chocolate-brown ↓ | 7838 | 244.53 Mrad |
| dark chocolate-brown ↓ | 7839 | 247.6 Mrad |
| dark chocolate-brown ↓ | 7840 | 252.4 Mrad |
| dark chocolate-brown ↓ | 7841 | 287.3 Mrad |
| dark chocolate-brown ↓ | 7842 | 297.4 Mrad |
| dark chocolate-brown ↓ | 7843 | 343.4 Mrad |
| dark chocolate-brown ↓ | 7844 | 360 Mrad |
| dark chocolate-brown ↓ | 7845 | 396.6 Mrad |
| dark chocolate-brown | 7846 | 425.704 Mrad<br>(followed at «very dark brown, almost black») |
| | | <u>production process:</u><br>(followed from «reddish brown»)<br>powder[973] filtered at 14 meshes and irradiated with gamma rays at: |
| dark chocolate-brown ↓ | 7847 | 284.6 Mrad |
| dark chocolate-brown ↓ | 7848 | 297.4 Mrad |
| dark chocolate-brown ↓ | 7849 | 337.9 Mrad |
| dark chocolate-brown ↓ | 7850 | 383.8 Mrad |
| dark chocolate-brown | 7851 | 396.6 Mrad |

1489

| | | |
|---|---|---|
| dark chocolate-brown ↓ | 7852 | 423.05 Mrad |
| dark chocolate-brown ↓ | 7853 | 484.704 Mrad |
| dark chocolate-brown ↓ | 7854 | 496.02 Mrad |
| dark chocolate-brown | 7855 | 555 Mrad |
| | | <u>production process:</u><br>(followed from «reddish brown»)<br>powder[973] filtered at 42 meshes and irradiated with gamma rays at: |
| dark chocolate-brown ↓ | 7856 | 284.6 Mrad |
| dark chocolate-brown ↓ | 7857 | 297.4 Mrad |
| dark chocolate-brown ↓ | 7858 | 337.8 Mrad |
| dark chocolate-brown ↓ | 7859 | 383.8 Mrad |
| dark chocolate-brown ↓ | 7860 | 396.6 Mrad |
| dark chocolate-brown ↓ | 7861 | 423.05 Mrad |
| dark chocolate-brown ↓ | 7862 | 484.704 Mrad |
| dark chocolate-brown ↓ | 7863 | 496.02 Mrad |
| dark chocolate-brown | 7864 | 555 Mrad |
| | | mineral : haematite<br>rock : medium chocolate-brown<br>powder : medium chocolate-brown<br>origin : Nouveau Québec, Québec |
| dark chocolate-brown | 7865 | <u>production process:</u><br>0↑1800 °F (dark violet-brown): 4 g + 80 ml nitric acid / soaking: 2 wk. / drying on hot plate |

1490

| | | |
|---|---|---|
| dark chocolate-brown | 7866 | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br>production process:<br>(followed from «medium chocolate-brown [light red tone]»)<br>2 g of haematite + 2 g of sulphur / 700 ºF / 1 h (followed at «dark chocolate-brown [light red tone]») |
| dark chocolate-brown | 7867 | mineral : hypersthene<br>rock : black<br>powder : medium brownish grey<br>origin : Lac Saint-Jean, Québec<br><br>production process:<br>2 g of hypersthene + 2 g of sodium carbonate / 0↑1600 ºF + 1 h at 1600 ºF (mixture of particles: brown / green) / irradiated with electrons at 162,431 rad |
| dark chocolate-brown | 7868 | mineral : ilmenite<br>rock : blackish grey, metallic brilliance<br>powder : blackish grey, metallic brilliance<br>origin : Québec Fer et Titane Co., Havre Saint-Pierre, Québec<br><br>production process:<br>3 g of ilmenite + 20 ml hydrochloric acid / soaking: 3 d. / drying on hot plate |
| dark chocolate-brown | 7869 | mineral : jade<br>rock : dark red (orange tone)<br>powder : orange (red tone)<br>origin : China<br><br>mineral : chrome<br>powder : light grey, with metallic brilliance<br><br>production process:<br>1 g of jade + 1 g of chrome / 2000 ºF / 45 min. |
| | | mineral : magnetite<br>rock : dark grey, with metallic brilliance<br>powder : dark grey<br>origin : Fosse du Labrador, Québec |

| | | |
|---|---|---|
| dark chocolate-brown | 7870 | production process:<br>0↑1900 °F |
| dark chocolate-brown | 7871 | production process:<br>(followed from «dark milky chocolate-brown»)<br>2 g of magnetite + 2 g of sodium carbonate / 1900 °F / 30 min. |
| dark chocolate-brown | 7872 | mineral : malachite<br>rock : ribboned variety of pronounced mint-green<br>powder : light and brilliant mint-green<br>origin : Katanga province, at 300 km from Lubumbachai, Zair, Africa<br><br>production process:<br>(followed from «light brown»)<br>0↑800 °F<br>(followed at «blackish chocolate-brown») |
| dark chocolate-brown | 7873 | mineral : mussel shell or calcium carbonate<br>shell : dark indigo-blue (violet tone)<br>powder : white<br>origin : bank of Saint-Lawrence river, Baie-des-Chaleurs, Gaspésie, Québec<br><br>mineral : chrome<br>powder : light grey, with metallic brilliance<br><br>production process:<br>(followed from «olive-green darker than "intense olive-green"»)<br>.74 g of powder + 1 g of chrome / 1700 °F / 1 h (vivid grass-green) / irradiated with gamma rays at 430.4 Mrad |
| dark chocolate-brown | 7874 | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «blackish chocolate-brown»)<br>1 g of ochre + 1 g of sulphur / 0↑1000 °F<br>(followed at «dark reddish brown») |

| | | |
|---|---|---|
| dark chocolate-brown | 7875 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>(followed from «chocolate-brown darker than "medium chocolate-brown"»)<br>rock irradiated with gamma rays at 484.704 Mrad[974] |
| dark chocolate-brown | 7876 | mineral : peridotite<br>rock : medium grey<br>powder : medium brownish grey (green reflection)<br>origin : Thetford Mines, Québec<br><br>production process:<br>(followed from «mixture of particles: chamois-orange / orange-brown»)<br>2 g of peridotite + 2 g of sodium carbonate / 0↑1500 °F + 1:30 h at 1500 °F (orange-beige [red tone]) / irradiated with gamma rays at 424.7 Mrad |
| | | production process:<br>(followed from «brownish grey darker than "medium brownish grey"»)<br>rock irradiated with gamma rays at: |
| dark chocolate-brown ↓ | 7877 | 102.4 Mrad |
| much darker chocolate-brown ↓ | 7878 | 124.704 Mrad |
| still darker chocolate-brown (more accentuated brown tone) ↓ | 7879 | 148.4 Mrad |
| chocolate-brown much more accentuated ↓ | 7880 | 201.6 Mrad[975] |
| chocolate-brown a bit more accentuated ↓ | 7881 | 247.6 Mrad |
| chocolate-brown still a bit more accentuated ↓ | 7882 | 287.3 Mrad |

1493

| | | |
|---|---|---|
| chocolate-brown still a bit more accentuated | 7883 | 360 Mrad<br><br>(followed at «dark russet brown») |
| dark chocolate-brown | 7884 | mineral : iron pyrite<br>powder : greyish brown, with golden yellow metalic brilliance<br>origin : Rigaud seigniory, Beauce county, Québec<br><br>production process:<br>2 g of pyrite + 2 g of sodium carbonate / 0↑1500 °F + 1 h at 1500 °F<br>(followed at «metallic grey») |
| dark chocolate-brown | 7885 | mineral : pyrochlore<br>powder : reddish brown<br>origin : De-Mix quarry, North side of Mont Saint-Hilaire, Rouville county, Québec<br><br>production process:<br>.40 g of pyrochlore + 50 ml nitric acid / soaking: 2 wk. / drying on hot plate (light chocolate-brown) / irradiated with gamma[239] rays at 424.7 Mrad |
| dark chocolate-brown | 7886 | production process:<br>(followed from «reddish brown»)<br>irradiated with gamma rays at 424.7 Mrad |
| dark chocolate-brown | 7887 | mineral : pyrolusite[101]<br>rock : black (light brown tone), mat<br>powder : black (light brown tone), mat<br>origin : probably Nova Scotia<br><br>production process:<br>1300 °F / 1 h |
| | | mineral : pyrolusite[101]<br>rock : black (light brown tone), mat<br>powder : black (light brown tone), mat<br>origin : probably Nova Scotia<br><br>mineral : sulphur<br>rock : brilliant yellow<br>powder : brilliant yellow<br>origin : unknown<br><br>production process:<br>(followed from «very powerful emerald-green») |

1494

| | | |
|---|---|---|
| dark chocolate-brown | 7888 | 1 g of pyrolusite + 4 g of sodium carbonate + 1 g of sulphur / 0↑1600 °F<br>(followed at «very intense emerald-blue») |
| dark chocolate-brown | 7889 | mineral : pyrophillite<br>rock : light beige (grey and pink tones), opaque<br>powder : very light beige (grey and orange-pink tones)<br>origin : Carpentier district, Abitibi, Québec<br><br><u>production process:</u><br>0↑1900 °F (light grey): .20 g + 50 ml nitric acid / soaking: 2 wk. / drying on hot plate (mixture of particles: rusty brown / creamy beige) / irradiated with gamma rays at 424.7 Mrad[81] |
| | | mineral : pyrrhotite[276]<br>rock : dark greyish brown, with golden yellow metallic brilliance<br>powder : dark grey<br>origin : Inco Co., Sudbury, Ontario<br><br><u>production process:</u><br>(followed from «reddish brown»)<br>rock irradiated with gamma rays at: |
| dark chocolate-brown ↓ | 7890 | 287.3 Mrad |
| darker chocolate-brown ↓ | 7891 | 360 Mrad |
| still darker chocolate-brown | 7892 | 482.984 Mrad[976] |
| dark chocolate-brown | 7893 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>(followed from «chocolate-brown darker than "chocolate-brown"»)<br>rock irradiated with gamma rays at 484.704 Mrad[977,978] |
| dark chocolate-brown | 7894 | <u>production process:</u><br>(followed from «rusty brown»)<br>4 g of pyrrhotite + 50 ml hydrochloric acid / soaking: 2 wk. / drying on hot plate (medium rusty |

| | | |
|---|---|---|
| | | orange [brown tone]) / irradiated with gamma rays at 430.4 Mrad |
| dark chocolate-brown | 7895 | mineral : crystalline quartz<br>rock : colourless<br>origin : Ferme Adam, Bonsecours, Eastern Townships, Québec<br><br><u>production process:</u><br>rock irradiated with electrons at 155,082 rad (light milky chocolate-brown tint), then with gamma rays at 360 Mrad |
| dark chocolate-brown | 7896 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>4 g of quartz - mica + 100 ml sulphuric acid / soaking: 1 wk. / drying on hot plate |
| dark chocolate-brown | 7897 | mineral : quartz<br>rock : light pink, translucid<br>powder : very light grey<br>origin : unknown<br><br><u>production process:</u><br>(followed from «light brown [light green tone]»)<br>4 g of quartz + 40 ml hydrochloric acid / soaking: 7 d. / separation of the liquid and the solid / natural drying (colour of the solid: light green) / irradiated with gamma rays at 424.7 Mrad |
| dark chocolate-brown | 7898 | <u>production process:</u><br>rock irradiated with gamma rays at:<br>5 Mrad[979] |
| dark chocolate-brown equivalent to the previous one | 7899 | 10 Mrad |
| dark chocolate-brown equivalent to the previous one | 7900 | 57.4 Mrad<br><br>(followed at «dark chocolate-brown [grey tone]»)<br><br>(followed from «very dark chocolate-brown [grey tone]») |

1496

| | | |
|---|---|---|
| ↓<br>chocolate-brown still darker than «very dark chocolate-brown» | 7901 | 360 Mrad<br><br>(followed at «medium chocolate-brown») |
| | 7902 | mineral : shale (formation of Sillery)<br>rock : medium cold grey<br>origin : city of Québec, Québec<br><br>production process:<br>(followed from «cold grey much more accentuated than "medium grey"») |
| dark chocolate-brown | 7903 | rock irradiated with gamma rays at 484.704 Mrad |
| | | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br><br>production process: |
| dark chocolate-brown | 7904 | 50 g of shale + 100 ml phosphoric acid / soaking: 3 wk. / drying on hot plate (still humid) / colour of the solid[980] |
| dark chocolate-brown | 7905 | production process:<br>2 g of shale + 20 ml hydrochloric acid / soaking: 2 wk. / irradiated with gamma rays at 5.7 Mrad / drying on sand bath, completed on hot plate[981] |
| | | mineral : sericite shale<br>rock : light grey (green reflection)<br>powder : very, very light grey<br>origin : Magog, Québec<br><br>production process: |
| dark chocolate-brown | 7906 | 2 g of shale + 20 ml hydrochloric acid / soaking: 3 d. / drying on hot plate |
| | | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>1600 °F / 15 h (very dark chocolate-brown, almost |

1497

| | | |
|---|---|---|
| | | black) / rock irradiated with gamma rays at: |
| dark chocolate-brown ↓ | 7907 | 64.7 Mrad |
| chocolate-brown slightly more pale | 7908 | 424.7 Mrad |
| | | production process: (followed from «medium chocolate-brown») |
| dark chocolate-brown ↓ | 7909 | 0↑1400 °F |
| dark chocolate-brown ↓ | 7910 | 0↑1500 °F |
| dark chocolate-brown ↓ | 7911 | 0↑1600 °F |
| dark chocolate-brown | 7912 | 0↑1700 °F |
| | | mineral : spodumene<br>rock : pale green<br>powder : light grey, almost white<br>origin : Québec Lithium Co., Baraute, Abitibi, Québec |
| dark chocolate-brown | 7913 | production process: 2 g of spodumene + 2 g of sodium carbonate / 0↑1500 °F + 1 h at 1500 °F (mixture of particles: olive-green / brown) / irradiated with electrons at 162,431 rad |
| | | production process: rock[982] irradiated with gamma rays at: |
| pale green | 7914 | 5 Mrad |
| which | 7915 | 10 Mrad |
| | 7916 | 57.4 Mrad |
| | 7917 | 65.704 Mrad |
| | 7918 | 102.4 Mrad |
| evolves towards | 7919 | 148.4 Mrad |
| | 7920 | 201.6 Mrad |
| | 7921 | 244.53 Mrad |
| | 7922 | 247.6 Mrad |
| | 7923 | 287.3 Mrad |
| | 7924 | 360 Mrad |
| ↓ | 7925 | 425.704 Mrad |
| dark chocolate-brown | 7926 | 604.53 Mrad[133,983] |
| | | mineral : tremolite |

| | | |
|---|---|---|
| | | rock : medium brown (evergreen tone)<br>powder : greyish beige<br>origin : Tetreault Mine, Montauban, Portneuf county, Québec<br><br><u>production process:</u><br>(followed at «rusty brown»)<br>0↑1900 °F (orange-beige): .30 g + 50 ml hydrochloric acid / soaking: 2 wk. / drying on hot plate (orange-beige) / irradiated with gamma$^{239}$ rays at 424.7 Mrad |
| dark chocolate-brown | 7927 | |
| | | mineral : tungsten or wolframite<br>rock : dark grey with metallic brilliance<br>origin : Burnt Hill Tungsten Mine, region of Bathurst, New Brunswick<br><br><u>production process:</u><br>(followed from «iron-grey [brown tone]»)<br>rock irradiated with gamma rays at 482.984 Mrad |
| dark chocolate-brown | 7928 | |
| | | mineral : idocrase<br>rock : yellowish green<br>powder : beige (green tone)<br>origin : Jeffrey Mine, Asbestos (presently J.-M. Asbestos), Québec<br><br><u>production process:</u><br>1 g of vesuvianite + 1 g of sodium carbonate / 1600 °F / 1 h |
| dark chocolate-brown | 7929 | |
| | | mineral : zincite<br>rock : mixture of areas: dark grey / orange-red<br>powder : medium milky chocolate-brown (red tone)<br>origin : Franklin, New Jersey, United States<br><br><u>production process:</u><br>(followed from «light beige»)<br>2 g of zincite + 2 g of sodium carbonate: |
| dark chocolate-brown ↓ | 7930 | 0↑1400 °F + 15 min. at 1400 °F |
| dark chocolate-brown ↓ | 7931 | 0↑1400 °F + 30 min. at 1400 °F |
| dark chocolate-brown | 7932 | 0↑1400 °F + 45 min. at 1400 °F<br>(followed at «pale orange-yellow») |
| | | <u>production process:</u><br>(followed from «chocolate-brown darker and more |

| | | |
|---|---|---|
| dark chocolate-brown | 7933 | brown than "medium chocolate-brown"»)<br>0↑1600 °F<br>(followed at «dark iron-grey») |
| dark chocolate-brown | 7934 | mineral : zircon<br>rock : grey and brown<br>origin : Mont Saint-Hilaire, Québec<br><br><u>production process:</u><br>(followed from «medium chocolate-brown»)<br>irradiated with gamma rays at 360 Mrad<br>(followed at «blackish brown») |
| dark chocolate-brown | 7935 | <u>production process:</u><br>1500 °F / 1 h |
| dark chocolate-brown | 7936 | <u>production process:</u><br>1 g of zircon + 1 g of sodium carbonate / 1600 °F / 1 h |
| dark chocolate-brown [accentuated blue and pink watering] | 7936.1 | mineral : serandite<br>rock : beige (light pinkish orange tone), opaque<br>powder : light pink<br>origin : De-Mix quarry, North side of Mont Saint-Hilaire, Rouville county, Québec<br><br><u>production process:</u><br>1 g of serandite + 5 g of pyrex / manual grinding / heating: 5 °C per min. 0↑1245 °C + maintenance during 1 h / cooling: 5 °C per min. until ambient temperature is reached / the entity is done in ambient air (watering: indigo-blue / light grey / light pinkish brown / medium pinkish brown) / irradiated with gamma rays at 9.88 Mrad |
| dark chocolate-brown a bit more vivid than «dark chocolate-brown» | 7937 | mineral : iron oxide[754]<br>powder : dark chocolate-brown<br>origin : unknown<br><br><u>production process:</u><br>irradiated with electrons at 162,431 rad |
| | | mineral : chalcopyrite<br>rock : brass-yellow, with metallic brilliance<br>powder : dark grey (with golden particles)<br>origin : Noranda Mines, Noranda, Abitibi, Québec |

1500

| | | |
|---|---|---|
| 2 areas: chocolate-brown a bit darker than «dark chocolate-brown» / yellowish orange a bit more accentuated than «vivid yellowish orange» | 7937.1 | production process:<br>1 g of chalcopyrite + 5 g of pyrex / manual grinding / heating: 5 °C per min. 0↑1245 °C + maintenance during 1 h / cooling: 5 °C per min. until ambient temperature is reached / the entity is done in ambient air (2 areas: dark chocolate-brown / vivid orange [yellow tone]) / irradiated with gamma rays at 9.88 Mrad |
| chocolate-brown a bit darker [brown] intense and luminous than «dark chocolate-brown» | 7938 | mineral : yofortierite[97]<br>rock : dark chocolate-brown (with pinkish brown areas)<br>powder : dark chocolate-brown<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br>production process:<br>2 g of yofortierite + 2 g of sulphur / 1300 °F / 1 h (mossy chocolate-brown a bit lighter than «dark mossy chocolate-brown») / irradiated with gamma[239] rays at 424.7 Mrad[81] |
| chocolate-brown darker and more intense than «dark chocolate-brown» | 7939 | mineral : calcite<br>rock : light pink<br>powder : pinkish white<br>origin : Huddersfield district, Pontiac county, Québec<br><br>mineral : sulphur<br>rock : brilliant yellow<br>powder : brilliant yellow<br>origin : unknown<br><br>production process:<br>2 g of calcite + 2 g of sulphur / 1300 °F / 1 h (dark chocolate-brown) / irradiated with gamma[239] rays at 424.7 Mrad[81] |
| | | mineral : chromite[294]<br>rock : dark grey<br>powder : dark grey |

| | | |
|---|---|---|
| chocolate-brown a bit darker [brown] and intense than «dark chocolate-brown» | 7940 | origin : Black Lake, Eastern Townships, Québec<br><br><u>production process:</u><br>1300 °F / 1 h (dark chocolate-brown [less dark than with sulphur]) / irradiated with gamma[239] rays at 424.7 Mrad[81] |
| chocolate-brown darker and more intense than «dark chocolate-brown» | 7941 | mineral : chromite[294]<br>rock : dark grey<br>powder : dark grey<br>origin : Black Lake, Eastern Townships, Québec<br><br>mineral : sulphur<br>rock : brilliant yellow<br>powder : brilliant yellow<br>origin : unknown<br><br><u>production process:</u><br>2 g of chromite + 2 g of sulphur / 1300 °F / 1 h (dark chocolate-brown) / irradiated with gamma[239] rays at 424.7 Mrad[81] |
| chocolate-brown darker than «dark chocolate-brown» | 7942 | mineral : chalcocite<br>rock : dark iron-grey (with localized turquoise oxidation)<br>powder : dark iron-grey<br>origin : Butte, Montana, United States<br><br>mineral : sulphur<br>rock : brilliant yellow<br>powder : brilliant yellow<br>origin : unknown<br><br><u>production process:</u><br>2 g of chalcocite + 2 g of sulphur / 1300 °F / 1 h (dark chocolate-brown) / irradiated with gamma rays at 424.7 Mrad[81] |
| chocolate-brown darker than «dark chocolate-brown» | 7943 | mineral : magnetite<br>rock : dark grey, with metallic brilliance<br>powder : dark grey<br>origin : Fosse du Labrador, Québec<br><br><u>production process:</u><br>0↑1900 °F (dark chocolate-brown) / irradiated with gamma[239] rays at 64.7 Mrad (followed at «chocolate-brown [red reflection]») |

1502

| | | |
|---|---|---|
| chocolate-brown darker than «dark chocolate-brown» | 7944 | mineral : smaltite[25], variety of skutterudite<br>rock : dark iron-grey, with silver metallic brilliance<br>powder : dark grey<br>origin : Cobalt, Ontario<br><br>production process:<br>(followed at «dark chocolate-brown [grey tone]»)<br>2 g of smaltite + 2.50 g of sodium carbonate:<br>0↑1300 °F + 1 h at 1300 °F |
| ↓ | | |
| still darker chocolate-brown (with dark violet -blue particles) | 7945 | 0↑1400 °F + 1 h at 1400 °F<br><br>(followed at «dark grey [with "dark violet-blue" particles]») |
| chocolate-brown darker than «dark chocolate-brown» | 7946 | mineral : sodalite<br>rock : indigo-blue, slightly translucid<br>powder : light grey (light blue tone)<br>origin : possibly Africa<br><br>production process:<br>(followed at «dark chocolate-brown [green tone]»)<br>1 g of sodalite + 1 cc of synthetic white transparent enamel paint used for the car / manual grinding / application on a piece of steel sheet used for the car's body measuring 1" x 1" (dark green [light grey tone]) / irradiated with gamma rays at 360 Mrad[984] |
| very dark chocolate-brown | 7947 | mineral : apatite<br>rock : reddish brown<br>powder : light pinkish beige<br>origin : Calumet, Pontiac county, Québec<br><br>production process:<br>(followed from «dark chocolate-brown»)<br>rock irradiated with gamma rays at 604.53 Mrad |
| | | mineral : fluorine<br>rock : light pink, translucid<br>powder : white (light pink reflection)<br>origin : Saint-Lawrence Fluorspar Company, Saint-Lawrence, Newfoundland |

| | | |
|---|---|---|
| very dark chocolate-brown | 7948 | production process:<br>(followed from «pink [red tone]»)<br>1000 ºC / 1 h (medium pink [light orange tone]) / powder irradiated with gamma rays at 482.984 Mrad |
| very dark chocolate-brown | 7949 | mineral : magnetite<br>rock : dark grey, with metallic brilliance<br>powder : dark grey<br>origin : Fosse du Labrador, Québec<br><br>production process:<br>3 g of magnetite + 80 ml nitric acid / soaking: 2 wk. / drying on hot plate (dark brown) / irradiated with gamma[239] rays at 424.7 Mrad[538] |
| very dark chocolate-brown | 7950 | mineral : serandite<br>rock : orange-pink or salmon (with more orange areas)<br>powder : pinkish white<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br>production process:<br>2 g of serandite + 2 g of sulphur / 1300 ºF / 1 h |
| | | mineral : sylvite<br>rock : colourless<br>powder : colourless<br>origin : Strassfurt, Prussia, Germany<br><br>production process:<br>(followed from «chocolate-brown [orange reflection]»)<br>rock irradiated with gamma rays at: |
| very dark chocolate-brown | 7951 | 102.4 Mrad[133] |
| still darker chocolate-brown | 7952 | 148.4 Mrad |
| still darker chocolate-brown | 7953 | 201.6 Mrad |
| still darker | 7954 | 247.6 Mrad |

| | | |
|---|---|---|
| chocolate-brown<br>↓<br>darker chocolate-brown | 7955 | 287.3 Mrad |
| ↓<br>still darker chocolate-brown | 7956 | 360 Mrad |
| chocolate-brown a bit more pale than «very dark chocolate-brown, almost black» | 7957 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>1600 °F / 15 h (very dark chocolate-brown, almost black) / rock irradiated with electrons at 305,200 rad[46] |
| chocolate-brown a bit less dark than «very dark chocolate-brown, almost black» | 7958 | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>1000 °C / 1 h (very dark chocolate-brown, almost black) / powder irradiated with gamma[509] rays at 122.98 Mrad<br>(followed at «chocolate-brown more intense than "very dark chocolate-brown, almost black"») |
| chocolate-brown a bit less dark than «very dark chocolate-brown, almost black» | 7959 | mineral : zincite<br>rock : mixture of areas: dark grey / orange-red<br>powder : medium milky chocolate-brown (red tone)<br>origin : Franklin, New Jersey, United States<br><br>production process:<br>0↑1900 °F (black): .40 g + 50 ml nitric acid / soaking: 2 wk. / drying on hot plate (very dark chocolate-brown, almost black) / irradiated with gamma rays at 64.7 Mrad<br>(followed at «dark chestnut-brown») |
| | | mineral : anorthosite<br>rock : dark grey |

| | | |
|---|---|---|
| very dark chocolate-brown, almost black | 7960 | powder : medium grey<br>origin : Jonquière, Lac Saint-Jean, Québec<br><br>production process:<br>(followed from «chocolate-brown darker than "medium chocolate-brown"»)<br>rock irradiated with gamma rays at 484.704 Mrad |
| very dark chocolate-brown, almost black | 7961 | mineral : copper concentrate (Cu-FeS)<br>powder : medium chocolate-brown (grey tone)<br>origin : Centre de recherche des Mines Noranda in Montréal, Québec<br><br>production process:<br>2 g of concentrate + 2 g of sodium carbonate:<br>0↑1200 °F + 1 h at 1200 °F |
| ↓ | | |
| very dark chocolate-brown, almost black | 7962 | 0↑1300 °F + 1 h at 1300 °F |
| ↓ | | |
| very dark chocolate-brown, almost black | 7963 | 0↑1400 °F + 1 h at 1400 °F |
| ↓ | | |
| very dark chocolate-brown, almost black | 7964 | 0↑1500 °F + 15 min. at 1500 °F |
| ↓ | | |
| very dark chocolate-brown, almost black | 7965 | 0↑1500 °F + 30 min. at 1500 °F<br>(followed at «brown») |
| very dark chocolate-brown, almost black | 7966 | mineral : solid epidote<br>rock : brownish green<br>powder : brownish green<br>origin : James Bay, Québec<br><br>production process:<br>0↑1700 °F (dark reddish brown): 1 g + 40 ml hydrochloric acid / soaking: 1 wk. / separation of the liquid and the solid / natural drying (colour of the solid: rusty orange) / irradiated with gamma rays at 425.65 Mrad |
| | | mineral : goethite[106]<br>powder : rusty orange<br>origin : Red Mill, in the suburbs of Cap-de-la |

1506

| | | |
|---|---|---|
| | | -Madeleine, Québec<br><br>mineral : sulphur<br>rock : brilliant yellow<br>powder : brilliant yellow<br>origin : unknown<br><br>production process:<br>(followed from «blackish brown»)<br>3 g of goethite + 1 g of sodium carbonate + 1 g of sulphur / 1600 °F / 1 h<br>(followed at «blackish green») |
| very dark chocolate-brown, almost black | 7967 | |
| | | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>1000 °C / 1 h |
| very dark chocolate-brown, almost black | 7968 | |
| | | mineral : pyrochlore<br>powder : reddish brown<br>origin : De-Mix quarry, North side of Mont Saint-Hilaire, Rouville county, Québec<br><br>production process:<br>(followed from «rusty brown [orange tone]»)<br>.40 g of pyrochlore + 50 ml hydrochloric acid / soaking: 2 wk. / drying on hot plate (rusty brown) / irradiated with gamma rays at 424.7 Mrad[239] |
| very dark chocolate-brown, almost black | 7969 | |
| | | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>1600 °F / 15 h |
| very dark chocolate-brown, almost black | 7970 | |
| | | mineral : siderite<br>rock : caramel-brown (grey tone)<br>powder : light orange-beige<br>origin : De-Mix quarry, North side of Mont |

| | | |
|---|---|---|
| | | Saint-Hilaire, Rouville county, Québec<br><br>mineral : sulphur<br>rock : brilliant yellow<br>powder : brilliant yellow<br>origin : unknown<br><br>production process: |
| very dark chocolate-brown, almost black | 7971 | 2 g of siderite + 2 g of sulphur / 1300 °F / 1 h |
| | | mineral : zincite<br>rock : mixture of areas: dark grey / orange-red<br>powder : medium milky chocolate-brown (red tone)<br>origin : Franklin, New Jersey, United States<br><br>production process: |
| very dark chocolate-brown, almost black | 7972 | 0↑1900 °F (black): .40 g + 50 ml nitric acid / soaking: 2 wk. / drying on hot plate |
| | | mineral : zircon<br>rock : grey and brown<br>origin : Mont Saint-Hilaire, Québec<br><br>production process:<br>1500 °F / 1 h (dark chocolate-brown) / rock[228] irradiated with gamma rays at: |
| very dark chocolate-brown, almost black | 7973 | 64.7 Mrad |
| ↓ | | |
| very dark chocolate-brown, almost black | 7974 | 424.7 Mrad |
| | | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>(followed from «chocolate-brown a bit less dark than "very dark chocolate-brown, almost black"») |
| chocolate-brown more intense than «very dark chocolate-brown, almost black» | 7975 | 1000 °C / 1 h (very dark chocolate-brown, almost black) / powder irradiated with gamma[509] rays at 482.984 Mrad |

| | | |
|---|---|---|
| chocolate-brown a bit more brown and darker than «very dark chocolate-brown, almost black» | 7976 | mineral : siderite<br>rock : caramel-brown (grey tone)<br>powder : light orange-beige<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br>production process:<br>2 g of siderite + 2 g of sulphur / 1300 °F / 1 h (very dark chocolate-brown, almost black) / irradiated with gamma[239] rays at 424.7 Mrad[81] |
| chocolate-brown darker than «very dark chocolate-brown, almost black» | 7977 | mineral : chromite<br>rock : blackish grey<br>powder : medium brownish grey<br>origin : Black Lake, near Thetford Mines, Québec<br><br>production process:<br>0↑1900 °F (medium chocolate-brown): 1 g + 50 ml hydrochloric acid / soaking: 2 wk. / drying on hot plate (dark brown) / irradiated with gamma[239] rays at 424.7 Mrad[81] |
| dark chocolate-brown, a bit lighter than «blackish chocolate-brown» | 7978 | mineral : copper concentrate (Cu-FeS)<br>powder : medium chocolate-brown (grey tone)<br>origin : Centre de recherche des Mines Noranda in Montréal, Québec<br><br>production process:<br>2 g of concentrate + 2 g of sodium carbonate / 0↑1300 °F + 1 h at 1300 °F (very dark chocolate-brown, almost black) / irradiated with gamma[239] rays at:<br>64.7 Mrad |
| ↓ | | |
| dark chocolate-brown, a bit | 7979 | 424.7 Mrad |

| | | |
|---|---|---|
| lighter than «blackish chocolate-brown» | | |
| blackish chocolate-brown | 7980 | mineral : amazonite<br>rock : light greenish turquoise<br>powder : white (turquoise reflection)<br>origin : Lac Sairs, Témiscamingue, Québec<br><br>production process:<br>1 g of amazonite + 1 g of sodium carbonate / 1600 °F / 1 h |
| blackish chocolate-brown | 7981 | mineral : anorthosite<br>rock : dark grey<br>powder : medium grey<br>origin : Jonquière, Lac Saint-Jean, Québec<br><br>mineral : sulphur<br>rock : brilliant yellow<br>powder : brilliant yellow<br>origin : unknown<br><br>production process:<br>1 g of anorthosite + 3 g of sodium carbonate + 1 g of sulphur / 0↑1600 °F |
| blackish chocolate-brown | 7982 | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : unknown<br><br>production process:<br>(followed from «mossy green»)<br>1 g of antigonite + 3 g of sodium carbonate + 1 g of sulphur / 0↑1600 °F<br>(followed at «black») |
| | | mineral : chalcocite<br>rock : dark iron-grey (with localized turquoise oxidation)<br>powder : dark iron-grey<br>origin : Butte, Montana, United States<br><br>production process:<br>(followed at «black [grey reflection]») |

1510

| | | |
|---|---|---|
| blackish chocolate-brown | 7983 | 0↑1900 °F (dark iron-grey) / powder irradiated with gamma rays at 424.7 Mrad |
| blackish chocolate-brown | 7984 | mineral : chalcopyrite<br>rock : brass-yellow, with metallic brilliance<br>powder : dark grey (with golden particles)<br>origin : Noranda Mines, Noranda, Abitibi, Québec<br><br>production process:<br>(followed from «brownish grey darker than "dark brownish grey"»)<br>powder irradiated with gamma[239,985] rays at 484.704 Mrad |
| blackish chocolate-brown | 7985 | mineral : clay<br>block : pale greyish green<br>powder : pale greyish green<br>origin : bank of Saint-Lawrence river, at the rear of the Miguasha Museum, Gaspésie, Québec<br><br>production process:<br>0↑1900 °F (medium brown [orange-red tone]): 1 g + 50 ml phosphoric acid / soaking: 4 years / drying on hot plate (still humid) |
| blackish chocolate-brown | 7986 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>(followed from «medium rusty brown»)<br>2 g of goethite + 1 g of sodium carbonate + 1 g of sulphur + 1 g of titanium dioxide / 1600 °F / 1 h |
| blackish chocolate-brown | 7987 | 1 g of goethite + 2 g of sodium carbonate + 1 g of sulphur + 1 g of titanium dioxide / 1600 °F / 1 h<br><br>(followed at «dark chocolate-brown [orange tone]») |

| | | |
|---|---|---|
| ↓ blackish chocolate-brown | 7988 | (followed from «dark chocolate-brown [orange tone]») 2 g of goethite + 2 g of sodium carbonate + 2 g of sulphur + 2 g of titanium dioxide / 1600 °F / 1 h |
| blackish chocolate-brown | 7989 | mineral : goethite[106]<br>powder : rusty orange<br>origin : Red Mill, in the suburbs of Cap-de-la -Madeleine, Québec<br><br>production process:<br>2 g of goethite + 20 ml of a solution of tartaric acid[35] / soaking: 3 d. / drying on hot plate (dark chocolate-brown [grey tone]) / irradiated with gamma rays at 64.7 Mrad<br>(followed at «orange-brown [between medium and dark orange-brown]») |
| blackish chocolate-brown | 7990 | mineral : haematite<br>rock : medium chocolate-brown<br>powder : medium chocolate-brown<br>origin : Nouveau Québec, Québec<br><br>production process:<br>(followed from «dark chocolate-brown [red tone]»)<br>2 g of haematite + 2 g of sodium carbonate / 0↑1900 °F + 1 h at 1900 °F |
| blackish chocolate-brown | 7991 | mineral : malachite<br>rock : ribboned variety of pronounced mint-green<br>powder : light and brilliant mint-green<br>origin : Katanga province, at 300 km from Lubumbachai, Zaïr, Africa<br><br>production process:<br>(followed from «dark chocolate-brown»)<br>0↑850 °F<br>(followed at «brownish black») |
| blackish chocolate-brown | 7991.1 | production process:<br>1 g of malachite + 1 g of caustic soda / grinding |
| | | mineral : ochre[111]<br>powder : dark reddish brown<br>origin : Red Mill, in the suburbs of Cap-de-la -Madeleine, Québec<br><br>mineral : zirconium silicate<br>powder : white (very light yellow reflection)<br>origin : Sial Company, Québec |

| | | |
|---|---|---|
| blackish chocolate-brown | 7992 | production process:<br>1 g of ochre + 1 g of zirconium silicate / 0↑700 °F<br>(followed at «dark chocolate-brown [light pink tone]») |
| blackish chocolate-brown | 7993 | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>1 g of ochre + 1 g of sulphur / 0↑700 °F<br>(followed at «dark chocolate-brown») |
| blackish chocolate-brown | 7994 | mineral : sardonyx<br>rock : white, slightly translucid (with a light orange-amber circular area on the surface)<br>powder : very light grey<br>origin : unknown<br><br>mineral : sulphur<br>rock : brilliant yellow<br>powder : brilliant yellow<br>origin : unknown<br><br>production process:<br>1 g of sardonyx + 1 g of sulphur / 1600 °F / 1 h |
| mixture of particles | | |
| mostly chocolate-brown a bit darker than «chocolate-brown» / light beige / white | 7995 | mineral : sphalerite[27]<br>rock : dark grey, with golden yellow metallic brilliance<br>powder : dark brownish grey<br>origin : Matagami Mine, Matagami, Québec<br><br>production process:<br>0↑1800 °F (medium chocolate-brown): 1 g + 50 ml nitric acid / soaking: 2 wk. / drying on hot plate (mixture of particles: brown / white) / irradiated with gamma rays at:<br>64.7 Mrad |

1513

| | | |
|---|---|---|
| ↓<br>mostly chocolate-brown a bit darker than «chocolate-brown» / light beige / white | 7996 | 424.7 Mrad |
| medium chocolate-brown / light beige / grey / greenish grey | 7997 | mineral : chalcocite<br>rock : dark iron-grey (with localized turquoise oxidation)<br>powder : dark iron-grey<br>origin : Butte, Montana, United States<br><br>production process:<br>(followed from «light mint-green»)<br>0↑1900 °F (dark iron-grey): 1 g + 50 ml sulphuric acid / soaking: 2 wk. / separation of the liquid and the solid / drying on hot plate (colour of the solid: light mint-green [blue tone]) / irradiated with gamma rays at 424.7 Mrad |
| medium chocolate-brown / intense yellow | 7998 | mineral : chromite<br>rock : blackish grey<br>powder : medium brownish grey<br>origin : Black Lake, near Thetford Mines, Québec<br><br>production process:<br>(followed from «yellowish green or greenish yellow darker than "intense yellowish green or intense greenish yellow"»)<br>2 g of chromite + 2 g of sodium carbonate / 0↑1700 °F + 1 h at 1700 °F (intense yellowish green) / irradiated with gamma rays at 424.7 Mrad |
| dark chocolate-brown / pale grey / medium beige | 7999 | mineral : chalcopyrite<br>powder : dark grey (light green tone)<br>origin : Centre de recherche des Mines Noranda in Montréal, Québec<br><br>production process:<br>(followed from «medium orange-brown»)<br>2 g of chalcopyrite + 2 g of sodium carbonate / 0↑1600 °F + 1 h at 1600 °F (mossy chocolate-brown [pink tone]) / irradiated with gamma rays at 424.7 Mrad |
| | | mineral : spodumene<br>rock : pale green<br>powder : light grey, almost white<br>origin : Québec Lithium Co., Barraute, Abitibi, |

1514

| | | |
|---|---|---|
| | | Québec |
| dark chocolate-brown / grey more or less dark | 8000 | <u>production process:</u><br>(followed from «dark grey»)<br>2 g of spodumene + 2 g of sodium carbonate / 0↑1500 °F + 1 h at 1500 °F (mixture of particles: olive-green / brown) / irradiated with gamma rays at 423.98 Mrad |
| chocolate-brown (crimson tone) | | |
| dark chocolate-brown (crimson tone) | 8000.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>(followed from «dark brown [light crimson tone]») grinding to a fine powder / 0↑1300 °F + 4 h at 1300 °F (yellow more accentuated than «light yellow»): 1 g + 5 g of pyrex / manual grinding / heating: 5 °C per min. 0↑1245 °C + maintenance during 1 h / cooling: 5 °C per min. until ambient temperature is reached / the entity is done in ambient air (very, very light yellowish green) / irradiated with gamma rays at 9.88 Mrad |
| dark chocolate-brown (localized crimson tone) | 8001 | mineral : smaltite[25], variety of skutterudite<br>rock : dark iron-grey, with silver metallic brilliance<br>powder : dark grey<br>origin : Cobalt, Ontario<br><br><u>production process:</u><br>0↑1900 °F (dark brown): .30 g + 50 ml hydrochloric acid / soaking: 2 wk. / separation of the liquid and the solid / drying on hot plate (colour of the solid: intense olive-green) / irradiated with gamma rays at 424.7 Mrad |
| chocolate-brown (green tone) | | |
| | | mineral : hornblende<br>rock : medium evergreen (light grey tone), with a vitreous brilliance<br>powder : medium cold grey (light green tone)<br>origin : Abitibi, Québec<br><br>mineral : chrome<br>powder : light grey, with metallic brilliance |

1515

| | | |
|---|---|---|
| medium chocolate-brown (light green tone) | 8002 | production process:<br>1 g of hornblende + 1 g of chrome / 2000 °F / 45 min.[989] |
| dark chocolate-brown (green tone) | 8003 | mineral : sodalite<br>rock : indigo-blue, slightly translucid<br>powder : light grey (light blue tone)<br>origin : possibly Africa<br><br>production process:<br>(followed from «blackish green [grey tone]»)<br>1 g of sodalite + 1 cc of synthetic white transparent enamel paint used for the car / manual grinding / application on a piece of steel sheet used for the car's body measuring 1" x 1" (dark green [light grey tone]) / irradiated with gamma rays at 102.4 Mrad<br>(followed at «chocolate-brown darker than "dark chocolate-brown"») |
| chocolate-brown (orange-yellow tone) | | |
| chocolate-brown (orange-yellow tone) a bit darker than «chocolate-brown (orange-yellow tone) darker than "light chocolate-brown (orange-yellow tone)"» | 8004 | mineral : crystalline quartz<br>rock : colourless<br>origin : Ferme Adam, Bonsecours, Eastern Townships, Québec<br>production process:<br>(followed from «greyish brown [yellow tone] darker than "light greyish brown [yellow tone]"»)<br>rock irradiated with gamma rays at 57.4 Mrad<br><br>(followed at «chocolate-brown [reddish orange tone]») |
| chocolate-brown (golden tone) | | |
| dark chocolate-brown, with a white golden metallic | 8005 | mineral : biotite gneiss<br>rock : blackish grey, golden vitreous brilliance<br>powder : dark grey<br>origin : Grenville geological province, Québec<br>production process:<br>0↑1300 °F<br><br>(followed at «copper-yellow, with metallic reflection») |

| | | |
|---|---|---|
| brilliance | | |
| chocolate-brown (reddish amber tone) | | |
| chocolate-brown (reddish amber tone) a bit more accentuated than «dark chocolate-brown (reddish amber tone)» | 8005.1 | mineral : galena<br>rock : dark grey, with metallic brilliance<br>powder : dark grey, with metallic brilliance<br>origin : Trail, British Columbia<br><br>production process:<br>1 g of galena + 5 g of pyrex / manual grinding / heating: 5 °C per min. 0↑1245 °C + maintenance during 1 h / cooling: 5 °C per min. until ambient temperature is reached / the entity is done in ambient air (dark chocolate-brown [grey tone and orange reflection]) / irradiation with gamma rays at 9.88 Mrad |
| chocolate-brown (orange tone) | | |
| chocolate-brown (light orange tone) lighter than «light orange chocolate-brown»<br>↓ | 8006 | mineral : corundum<br>rock : medium grey<br>powder : light grey<br>origin : Transvaal, Africa<br><br>production process:<br>(followed from «light chocolate-brown»)<br>2 g of corundum + 2 g of sodium carbonate:<br>0↑1600 °F + 1 h at 1600 °F |
| chocolate-brown (light orange tone) lighter than «light orange chocolate-brown» | 8007 | 0↑1700 °F + 1 h at 1700 °F[990]<br><br>(followed at «mixture of particles: orange-brown / brown») |
| chocolate-brown (orange reflection) | 8008 | mineral : sylvite<br>rock : colourless<br>powder : colourless<br>origin : Strassfurt, Prussia, Germany<br><br>production process:<br>(followed from «greyish brown [pink reflection]»)<br>rock irradiated with gamma rays at 57.4 Mrad[991]<br>(followed at «very dark chocolate-brown») |

| | | |
|---|---|---|
| chocolate-brown (orange tone) more pale than «medium orange chocolate-brown» | 8009 | mineral : hypersthene<br>rock : black<br>powder : medium brownish grey<br>origin : Lac Saint-Jean, Québec<br><br>production process:<br>(followed from «orange-brown»)<br>1000 °C / 1 h (medium orange-brown) / powder irradiated with gamma[239] rays at 424.7 Mrad |
| chocolate-brown (very light orange tone) a bit more pale than «medium orange chocolate-brown» | 8010 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «chocolate-brown [grey tone]»)<br>0↑1600 °F (light milky chocolate-brown) / powder irradiated with gamma[239] rays at 424.7 Mrad |
| medium chocolate-brown (light orange tone) | 8011 | mineral : actinolite<br>rock : cold and light evergreen<br>powder : light grey (light green tone)<br>origin : erratic block found at Saint-Philémon near Dorchester, Québec<br><br>production process:<br>2 g of actinolite + 2 g of sodium carbonate / 0↑1900 °F + 1 h at 1900 °F (bluish green) / irradiated with electrons at 162,431 rad |
| medium chocolate-brown (orange tone) | 8012 | mineral : corundum<br>rock : medium grey<br>powder : light grey<br>origin : Transvaal, Africa<br><br>production process:<br>(followed from «light beige»)<br>1 g of corundum + 50 ml sulphuric acid / soaking: 2 wk. / drying on hot plate (very light cream) / irradiated with gamma rays at 430.4 Mrad |

| | | |
|---|---|---|
| medium chocolate-brown (orange reflection) | 8013 | mineral : peridotite<br>rock : medium grey<br>powder : medium brownish grey (green reflection)<br>origin : Thetford Mines, Québec<br><br>production process:<br>(followed from «grey [light green and brown tones]»)<br>powder irradiated with gamma rays at 550.22 Mrad[992] |
| chocolate-brown (light orange reflection), a bit darker than «medium chocolate-brown (orange reflection)» | 8014 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «rusty orange [brown tone]»)<br>1 g of goethite + 1 g of sulphur / irradiated with gamma rays at 360 Mrad |
| chocolate-brown (orange tone) a bit darker than «medium chocolate-brown (orange tone)» | 8015 | mineral : agate<br>rock : dark grass-green, slightly translucid<br>powder : light grey (light green tone)<br>origin : bank of Saint-Lawrence river, region of Maria, Gaspésie, Québec<br><br>mineral : sulphur<br>rock : brilliant yellow<br>powder : brilliant yellow<br>origin : unknown<br><br>production process:<br>2 g of agate + 2 g of sulphur / 1300 °F / 1 h (medium chocolate-brown [reddish orange tone]) / irradiated with gamma[239] rays at 424.7 Mrad[81] |
| | | mineral : sphalerite[27]<br>rock : dark grey, with golden yellow |

1519

| | | |
|---|---|---|
| | | metallic brilliance<br>powder : dark brownish grey<br>origin : Matagami Mine, Matagami, Québec<br><br><u>production process:</u><br>0↑1800 °F (medium chocolate-brown) / powder irradiated with gamma[239] rays at: |
| chocolate-brown (light orange tone) darker and more intense than «medium orange chocolate-brown»<br>↓ | 8016 | 64.7 Mrad |
| chocolate-brown (light orange tone) still darker and more intense | 8017 | 424.7 Mrad |
| | | mineral : tremolite<br>rock : medium brown (evergreen tone)<br>powder : greyish beige<br>origin : Tetreault Mine, Montauban, Portneuf county, Québec<br><br><u>production process:</u><br>(followed from «brown [evergreen tone]»)<br>rock irradiated with gamma rays at: |
| chocolate-brown (with orange areas), much darker than «medium orange chocolate-brown»<br>↓ | 8018 | 102.4 Mrad[993] |
| darker chocolate-brown (with orange areas)<br>↓ | 8019 | 201.6 Mrad |
| much darker chocolate-brown (with orange areas)<br>↓ | 8020 | 242.804 Mrad |
| still darker chocolate-brown (with orange areas)<br>↓ | 8021 | 247.6 Mrad |
| still darker chocolate-brown (with orange | 8022 | 287.3 Mrad |

1520

| | | |
|---|---|---|
| areas)<br>↓<br>darker chocolate-brown (with orange areas) | 8023 | 360 Mrad<br>(followed at «very dark chocolate-brown [with reddish orange areas]») |
| chocolate-brown (orange reflection) lighter than «dark orange chocolate-brown» | 8024 | mineral : zircon<br>rock : grey and brown<br>origin : Mont Saint-Hilaire, Québec<br><br>production process:<br>1500 °F / 1 h (dark chocolate-brown) / irradiated with electrons at 164,800 rad<br><br>(followed at «medium orange-brown») |
| dark chocolate-brown (orange reflection) | 8024.1 | mineral : galena<br>rock : dark grey, with metallic brilliance<br>powder : dark grey, with metallic brilliance<br>origin : Trail, British Columbia<br><br>production process:<br>.45 g of galena + 5 g of pyrex / manual grinding / heating: 5 °C per min. 0↑1245 °C + maintenance during 1 h / cooling: 5 °C per min. until ambient temperature is reached / the entity is done in ambient air |
| dark orange chocolate-brown<br>↓<br>still darker orange chocolate-brown | 8024.1a<br><br>8024.1b | production process:<br>1 g of galena + 6.50 g of glass powder (spruce pine batch) / manual grinding / deposited on a ceramic plate at the state of a biscuit / heating in furnace 0↑1000 °C in ambient air / slow cooling in furnace (2 areas: dark brown [caramel tone] / dark green) / irradiated with gamma rays at:<br>4.94 Mrad<br><br>9.88 Mrad |
| dark orange chocolate-brown | 8024.2 | mineral : copper concentrate (Cu-FeS)<br>powder : medium chocolate-brown (grey tone)<br>origin : Centre de recherche des Mines Noranda in Montréal, Québec<br><br>production process:<br>1 g of concentrated + 6.50 g of glass powder (spruce pine batch) / manual grinding / deposited |

1521

| | | |
|---|---|---|
| [with «vivid reddish orange areas»] | | on a ceramic plate at the state of a biscuit / heating in a furnace 0↑1000 °C in ambient air / slow cooling in furnace |
| dark orange chocolate-brown | 8025 | mineral : bloody agate<br>rock : dark grass-green, slightly translucid<br>powder : light grey (light green tone)<br>origin : India<br><br>production process:<br>1500 °F / 1 h |
| dark chocolate-brown (light orange tone) | 8026 | mineral : chromite<br>rock : blackish grey<br>powder : medium brownish grey<br>origin : Black Lake, near Thetford Mines, Québec<br><br>production process:<br>(followed from «medium chocolate-brown»)<br>0↑2000 °F |
| dark chocolate-brown (light orange tone) | 8027 | mineral : granite gneiss<br>rock : reddish beige<br>powder : medium pink (light brown tone)<br>origin : Lac Beauport, region of the city of Québec, Québec<br><br>production process:<br>(followed from «reddish brown [light orange tone]»)<br>rock irradiated with gamma[228] rays at 604.53 Mrad |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec |

1522

| | | |
|---|---|---|
| dark orange chocolate-brown | 8028 | <u>production process:</u><br>(followed from «blackish chocolate-brown»)<br>1 g of goethite + 1 g of sodium carbonate + 2 g of sulphur + 1 g of titanium dioxide / 1600 °F / 1 h<br>(followed at «blackish chocolate-brown») |
| dark orange chocolate-brown | 8029 | <u>production process:</u><br>(followed from «medium rusty brown»)<br>1 g of goethite + 1 g of sodium carbonate + 1 g of sulphur + 1 g of titanium dioxide / 1700 °F / 1 h<br>(followed at «blackish brown») |
| dark chocolate-brown (pronounced orange tone) | 8030 | mineral : haematite<br>rock : medium chocolate-brown<br>powder : medium chocolate-brown<br>origin : Nouveau Québec, Québec<br><br><u>production process:</u><br>4 g of haematite + 80 ml hydrochloric acid / soaking: 2 wk. / drying on hot plate |
| dark chocolate-brown (orange reflection) | 8031 | mineral : zincite<br>rock : mixture of areas: dark grey / orange-rouge<br>powder : medium milky chocolate-brown (red tone)<br>origin : Franklin, New Jersey, United States<br><br><u>production process:</u><br>(followed from «brown [very light grey and orange reflection]»)<br>4 g of zincite + 80 ml nitric acid / soaking: 2 wk. / drying on hot plate (medium rusty orange [brown tone]) / irradiated with gamma$^{239}$ rays at 424.7 Mrad |
| 2 areas: chocolate-brown very lightly more accentuated than «dark chocolate-brown (more acute orange tone) / reddish orange more vivid than | 8031.1 | mineral : copper concentrate (Cu-FeS)<br>powder : medium chocolate-brown (grey tone)<br>origin : Centre de recherche des Mines Noranda in Montréal, Québec<br><br><u>production process:</u><br>1 g of concentrate + 5 g of pyrex / manual grinding / heating: 5 °C per min. 0↑1245 °C + maintenance during 1 h / cooling: 5 °C per min. until ambient temperature is reached / the entity is done in ambient air (2 areas: dark chocolate-brown [orange tone] / vivid reddish orange) / irradiated with gamma rays at 9.88 Mrad |

| | | |
|---|---|---|
| «vivid reddish orange» | | |
| chocolate-brown (light orange tone) a bit darker than «dark orange chocolate-brown» | 8032 | mineral : pyrolusite[101]<br>rock : black (light brown tone), mat<br>powder : black (light brown tone), mat<br>origin : probably Nova Scotia<br><br>production process:<br>1300 °F / 1 h (dark chocolate-brown) / powder irradiated with gamma[239] rays at 424.7 Mrad[81] |
| chocolate-brown (light orange tone) darker than than «dark chocolate-brown (light orange tone)» | 8033 | mineral : hypersthene<br>rock : black<br>powder : medium brownish grey<br>origin : Lac Saint-Jean, Québec<br><br>mineral : sulphur<br>rock : brilliant yellow<br>powder : brilliant yellow<br>origin : unknown<br><br>production process:<br>(followed from «chocolate-brown [red tone] much darker than "dark chocolate-brown [red tone]"»)<br>2 g of hypersthene + 2 g of sulphur / 1500 °F / 1 h (dark chocolate-brown [red tone]) / irradiated with gamma[239] rays at 424.7 Mrad |
| chocolate-brown (light orange tone) much darker than «dark orange chocolate-brown» | 8034 | mineral : chromite<br>rock : blackish grey<br>powder : medium brownish grey<br>origin : Black Lake, near Thetford Mines, Québec<br><br>production process:<br>0↑2000 °F (dark chocolate-brown [light orange tone]) / powder irradiated with gamma[239] rays at 64.7 Mrad<br>(followed at «blackish and cold chocolate-brown [grey reflection]») |
| | | mineral : chalcocite |

1524

| | | |
|---|---|---|
| | | rock : dark iron-grey (with localized turquoise oxidation)<br>powder : dark iron-grey<br>origin : Butte, Montana, United States<br><br>production process: |
| 2 areas: chocolate-brown darker than «very dark chocolate-brown» [accentuated apple-green watering] / reddish orange more intense than «vivid reddish orange» | 8034.1 | 1 g of chalcocite + 5 g of pyrex / manual grinding / heating: 5 °C per min. 0↑1245 °C + maintenance during 1 h / cooling: 5 °C per min. until ambient temperature is reached / the entity is done in ambient air (2 areas: very dark chocolate-brown [with apple-green watering] / vivid reddish orange) / irradiated with gamma rays at 9.88 Mrad |
| | | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process: |
| blackish chocolate-brown (light orange reflection) | 8034.2 | 1 g of galena + 1 g of sulphur + 5 g of pyrex / manual grinding / heating: 5 °C per min. 0↑1245 °C + maintenance during 1 h / cooling: 5 °C per min. until ambient temperature is reached / the entity is done in ambient air (honey-yellow [localized pink reflections]) / irradiated with gamma rays at 9.88 Mrad |
| chocolate-brown (rusty orange tone) | | |
| | | mineral : actinolite<br>rock : cold and light evergreen<br>powder : light grey (light green tone)<br>origin : erratic block found at Saint-Philémon near Dorchester, Québec<br><br>production process:<br>(followed from «reddish brown») |
| dark chocolate-brown (light rusty orange reflection) | 8035 | 3 g of actinolite + 50 ml hydrochloric acid / soaking: 2 wk. / separation of the liquid and the solid / drying on hot plate (colour of the solid: medium orange-brown) / irradiated with gamma rays at 430.4 Mrad |

| | | |
|---|---|---|
| dark chocolate-brown (rusty orange tone) | 8036 | mineral : beryl<br>rock : intense grass-green, slightly translucid<br>powder : greenish grey<br>origin : unknown<br><br><u>production process:</u><br>(followed from «orange-brown a bit darker than "medium orange-brown"»)<br>1 g of beryl + 1 cc of synthetic white transparent enamel paint used for the car / manual grinding / application on a piece of steel sheet used for the car's body measuring 1" x 1" (khaki-green) / irradiated with gamma rays at 360 Mrad |
| dark chocolate-brown (light rusty orange reflection) | 8037 | mineral : almandite<br>rock : dark brownish red<br>powder : medium brownish red<br>origin : Gore Mountain, Warren county, state of New Nork, United States<br><br><u>production process:</u><br>(followed from «orange-brown darker than "orange-brown"»)<br>4 g of almandite + 80 ml hydrochloric acid / soaking: 2 wk. / drying on hot plate (orange-brown) / irradiated with gamma rays at 430.4 Mrad |
| dark chocolate-brown (light rusty orange tone) | 8038 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>(followed from «brown [reddish orange tone]»)<br>4 g of pyrrhotite + 20 ml hydrochloric acid / soaking: 3 d. / drying on hot plate (medium orange-brown) / irradiated with gamma rays at 424.7 Mrad |
| blackish chocolate-brown (rusty orange tone) | 8039 | mineral : uraninite<br>rock : medium chocolate-brown (red Bordeau tone)<br>powder : medium milky chocolate-brown<br>origin : Yellowknife, Canada<br><u>production process:</u><br>(followed from «dark chocolate-brown [brownish red tone]»)<br>rock irradiated with gamma rays at 482.984 Mrad |

| | | |
|---|---|---|
| | | mineral : steatite<br>rock : light evergreen<br>powder : white<br>origin : East Broughton, Québec<br><br>production process:<br>(followed from «orange [brown tone]»)<br>0↑2200 °F (light brown): 2 g + 80 ml hydrochloric acid / soaking: 2 wk. / drying on hot plate (chocolate-brown) / irradiated with gamma[239] rays at 430.4 Mrad |
| blackish chocolate-brown (localized rusty orange tone) | 8040 | |
| chocolate-brown (reddish orange tone) | | |
| | | mineral : crystalline quartz<br>rock : colourless<br>origin : Ferme Adam, Bonsecours, Eastern Townships, Québec<br><br>production process:<br>(followed from «chocolate-brown [orange-yellow tone]»)<br>rock irradiated with gamma rays at: |
| chocolate-brown (reddish orange tone) darker than «chocolate-brown (reddish orange tone) darker than "light chocolate-brown (reddish orange tone)"» | 8041 | 64.7 Mrad[994] |
| ↓ | | |
| slightly darker chocolate-brown (reddish orange tone) | 8042 | 102.4 Mrad |
| ↓ | | |
| still a bit darker chocolate-brown (reddish orange tone) | 8043 | 148.4 Mrad |
| ↓ | | |
| lighter chocolate-brown (reddish orange tone) | 8044 | 201.6 Mrad<br>(followed at «chocolate-brown [orange-red tone]») |
| | | mineral : agate<br>rock : dark grass-green, slightly translucid<br>powder : light grey (light green tone)<br>origin : bank of Saint-Lawrence river, region of Maria, Gaspésie, Québec |

1527

| | | |
|---|---|---|
| medium chocolate-brown (reddish orange tone) | 8045 | mineral : sulphur<br>rock : brilliant yellow<br>powder : brilliant yellow<br>origin : unknown<br><br>production process:<br>2 g of agate + 2 g of sulphur / 1300 °F / 1 h |
| dark chocolate-brown (light reddish orange tone) | 8046 | mineral : cerite<br>rock : dark brownish grey<br>powder : light grey (light brown tone)<br>origin : Jamestown, Boulder county, Colorado, United States<br><br>production process:<br>0↑1900 °F (medium brown): .60 g + 50 ml nitric acid / soaking: 2 wk. / separation of the liquid and the solid / drying on hot plate / colour of the solid[539] |
| chocolate-brown (reddish orange tone) darker than «dark chocolate-brown (reddish orange tone)» [the reddish orange tone is a bit more acute] | 8047 | production process:<br>0↑1900 °F (medium brown): .60 g + 50 ml nitric acid / soaking: 2 wk. / separation of the liquid and the solid / drying on hot plate (colour of the solid: dark chocolate-brown [light reddish orange tone]) / irradiated with gamma[239] rays at 424.7 Mrad[81] |
| very dark chocolate-brown [with reddish orange areas] | 8048 | mineral : tremolite<br>rock : medium brown (evergreen tone)<br>powder : greyish beige<br>origin : Tetreault Mine, Montauban, Portneuf county, Québec<br><br>production process:<br>(followed from «medium chocolate-brown [with orange areas]»)<br>rock irradiated with gamma rays at 602.804 Mrad |
| chocolate-brown (pink tone) | | |
| | | mineral : ochre[111]<br>powder : dark reddish brown<br>origin : Red Mill, in the suburbs of Cap-de-la-Madeleine, Québec |

1528

| | | |
|---|---|---|
| | | mineral : zirconium silicate<br>powder : white (very light yellow reflection)<br>origin : Sial Company, Québec<br><br>mineral : sulphur<br>rock : brilliant yellow<br>powder : brilliant yellow<br>origin : unknown<br><br>production process:<br>(followed from «chocolate-brown more pale than "dark chocolate-brown"»)<br>1 g of ochre + 1 g of zirconium silicate + 1 g of sulphur: |
| medium pinkish chocolate-brown<br>↓ | 8049 | 0↑1300 °F |
| medium chocolate-brown (more accentuated pink tone)<br>↓ | 8050 | 0↑1500 °F |
| medium chocolate-brown (pink tone still more accentuated) | 8051 | 0↑1600 °F<br><br>(followed at «medium pinkish brown») |
| | | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br><br>production process:<br>(followed from «pinkish brown») |
| medium chocolate-brown (light pink tone) | 8052 | powder irradiated with gamma rays at 484.704 Mrad[995] |
| | | mineral : stilbite<br>rock : white (honey-yellow reflection)<br>powder : white (honey-yellow reflection)<br>origin : Lac d'amiante Mine, Black Lake, Québec<br><br>mineral : sulphur<br>rock : brilliant yellow<br>powder : brilliant yellow<br>origin : unknown<br><br>production process: |
| medium pinkish chocolate-brown | 8053 | 1 g of stilbite + 1 g of sulphur / 1600 °F / 1 h |

1529

| | | |
|---|---|---|
| dark pinkish chocolate-brown | 8054 | mineral : goethite[106]<br>powder : rusty orange<br>origin : Red Mill, in the suburbs of Cap-de-la -Madeleine, Québec<br><br>mineral : feldspar<br>rock : white, opaque<br>powder : white<br>origin : Baraute, Abitibi, Québec<br><br>production process:<br>0↑1400 °F / slow cooling in furnace (indian red[107]): 1 g + 1 g of feldspar (dark reddish brown [tends towards Burgundy-red]): .50 g + .50 g of sodium carbonate / 1600 °F / 1 h<br>(followed at «dark brownish grey») |
| dark chocolate-brown (light pink tone) | 8055 | mineral : ochre[111]<br>powder : dark reddish brown<br>origin : Red Mill, in the suburbs of Cap-de-la -Madeleine, Québec<br><br>mineral : zirconium silicate<br>powder : white (very light yellow reflection)<br>origin : Sial Company, Québec<br><br>production process:<br>(followed from «blackish chocolate-brown»)<br>1 g of ochre + 1 g of zirconium silicate / 0↑1000 °F<br>(followed at «dark reddish brown») |
| chocolate-brown (with pinkish brown and beige areas), more accentuated and red than «dark pinkish chocolate-brown» | 8056 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>rock irradiated with gamma[228,996] rays at 122.984 Mrad[509]<br><br>(followed at «dark chocolate-brown [with old rose areas]») |
| chocolate-brown (old rose tone) | | |
| | | mineral : yofortierite[87] |

1530

| | | |
|---|---|---|
| chocolate-brown (with lighter old rose areas) darker than «chocolate-brown (old rose tone) darker than "chocolate-brown (old rose tone)"») | 8057 | rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «chocolate-brown [with "pinkish brown and beige areas"], more accentuated than "dark chocolate-brown"»)<br>rock irradiated with gamma[228] rays at 492.984 Mrad |
| chocolate-brown (red tone) | | |
| chocolate-brown (red tone) | 8058 | mineral : apatite<br>rock : dark grass-green (yellow tone), very slightly translucid<br>powder : powder filtered at 14 meshes: very, very light green; powder filtered beneath 14 meshes: light grey (beige tone and green reflection)<br>origin : Ile Calumet, Pontiac county, Québec<br><br>mineral : cement[1138]<br>powder : white<br><br>production process:<br>1 g of rocks of various sizes + 4.50 g of cement + 3 cc of water / manual mixing / moulding / hardening / irradiated with gamma rays at 18.85 Mrad / colour of the rocks[997] |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown |

| | | |
|---|---|---|
| chocolate-brown (very light red tone) | 8059 | <u>production process</u>:<br>(followed from «light chocolate-brown» and «chocolate-brown lighter than "chocolate-brown"»)<br>2 g of goethite + 24 g of sulphur / 800 ºF / 1 h[998,999,1000]<br><br>(followed from «medium chocolate-brown») |
| ↓ | | |
| chocolate-brown (red tone) | 8060 | (followed from «chocolate-brown lighter than "medium chocolate-brown"» and «light chocolate-brown»)<br>2 g of goethite + 12 of sulphur / 1000 ºF / 1 h[998,999,1000,1001]<br><br>(followed at «chocolate-brown lighter than "medium chocolate-brown"») |
| ↓ | | |
| reddish chocolate-brown [red tone more accentuated than the previous one] | 8061 | (followed from «chocolate-brown [very light red tone]»)<br>2 g of goethite + 24 g of sulphur / 1000 ºF / 1 h[998,999,1000]<br>(followed at «brown [light violet tone]» and «chocolate-brown lighter than "medium chocolate-brown"») |
| medium chocolate-brown (light red tone) | 8062 | mineral : galena<br>rock : dark grey, with metallic brilliance<br>powder : dark grey, with metallic brilliance<br>origin : Trail, British Columbia<br><br><u>production process</u>:<br>(followed from «vivid caramel-orange [red tone]»)<br>1 g of galena + 1 g of sodium carbonate / grinded and distributed in the porcelain covers of porcelain crucibles / 0↑1600 ºF[280,1002,1003]<br>(followed at «caramel-brown [orange tone]») |
| medium chocolate-brown (light red tone) | 8063 | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br><u>production process</u>:<br>(followed from «medium chocolate-brown»)<br>2 g of haematite + 2 g of sulphur / 600 ºF / 1 h<br><br>(followed at «dark chocolate-brown») |

| | | |
|---|---|---|
| | | <u>production process:</u><br>2 g of haematite + 2 g of sulphur / 1400 °F / 1 h (brown darker than «medium brown») / irradiated with gamma[239] rays at: |
| reddish or pinkish chocolate-brown, a bit more pale than «dark reddish or pinkish chocolate-brown»<br>↓ | 8064 | 64.7 Mrad |
| reddish or pinkish chocolate-brown still a bit more pale than «dark reddish or pinkish chocolate-brown» | 8065 | 424.7 Mrad |
| | | mineral : zincite<br>rock : mixture of areas: dark grey / orange-red<br>powder : medium milky chocolate-brown (red tone)<br>origin : Franklin, New Jersey, United States<br><br><u>production process:</u><br>2 g of zincite + 2 g of sodium carbonate / 0↑1400 °F + 30 min. at 1400 °F (dark chocolate-brown) / irradiated with gamma[239] rays at: |
| reddish chocolate-brown a bit lighter than «dark reddish chocolate-brown»<br>↓ | 8066 | 63.88 Mrad |
| reddish chocolate-brown a bit lighter than «dark reddish chocolate-brown» | 8067 | 423.88 Mrad |
| | | mineral : halite[41]<br>rock : colourless<br>powder : colourless<br>origin : Seleine Mine, Iles-de-la-Madeleine, Québec |

| | | |
|---|---|---|
| dark chocolate-brown (light red tone) | 8068 | production process:<br>rock irradiated with neutrons during 600 sec. at $10^{12}$ neutrons / $cm^2$ / sec. (grey darker than «light grey»), then with gamma rays at 360 Mrad[1004] |
| dark reddish chocolate-brown | 8069 | mineral : hypersthene<br>rock : black<br>powder : medium brownish grey<br>origin : Lac Saint-Jean, Québec<br><br>mineral : sulphur<br>rock : brilliant yellow<br>powder : brilliant yellow<br>origin : unknown<br><br>production process:<br>(followed from «orange-brown lighter than "medium orange-brown"»)<br>2 g of hypersthene + 2 g of sulphur / 1500 °F / 1 h |
| dark reddish chocolate-brown | 8070 | mineral : haematite<br>rock : medium chocolate-brown<br>powder : medium chocolate-brown<br>origin : Nouveau Québec, Québec<br><br>production process:<br>0↑1800 °F (dark violet-brown): 4 g + 80 ml nitric acid / soaking: 2 wk. / drying on hot plate (dark chocolate-brown) / irradiated with gamma rays at 64.7 Mrad<br>(followed at «reddish brown darker than "dark reddish brown"») |
| dark chocolate-brown (accentuated red tone) | 8071 | production process:<br>2 g of haematite + 2 g of sodium carbonate / 0↑1500 °F + 1 h at 1500 °F (dark chocolate-brown [light red tone]) / irradiated with electrons at 162,431 rad |
| dark chocolate-brown (light red tone) | 8072 | production process:<br>2 g of haematite + 2 g of sodium carbonate:<br>0↑1200 °F + 1 h at 1200 °F |
| darker chocolate-brown (light red tone) | 8073 | 0↑1300 °F + 1 h at 1300 °F |
| still darker chocolate-brown | 8074 | 0↑1400 °F + 1 h at 1400 °F |

| | | |
|---|---|---|
| (light red tone) | | |
| still darker chocolate-brown (light red tone) | 8075 | 0↑1500 °F + 1 h at 1500 °F |
| darker chocolate-brown (light red tone) | 8076 | 0↑1600 °F + 1 h at 1600 °F |
| still darker chocolate-brown (light red tone) | 8077 | 0↑1700 °F + 1 h at 1700 °F |
| still darker chocolate-brown (light red tone) | 8078 | 0↑1800 °F + 1 h at 1800 °F<br>(followed at «blackish chocolate-brown») |
| dark chocolate-brown (light red tone) | 8079 | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br><u>production process:</u><br>(followed from «dark chocolate-brown»)<br>2 g of haematite + 2 g of sulphur / 800 °F / 1 h<br><br>(followed at «medium reddish brown») |
| dark chocolate-brown (red Bordeau tone) | 8080 | mineral : uraninite<br>rock : medium chocolate-brown (red Bordeau tone)<br>powder : medium milky chocolate-brown<br>origin : Yellowknife, Canada<br><br><u>production process:</u><br>rock irradiated with gamma rays at 122.984 Mrad[509]<br>(followed at «blackish chocolate-brown [rusty orange tone]») |
| | | mineral : siderite<br>rock : caramel-brown (grey tone)<br>powder : light orange-beige<br>origin : De-Mix quarry, North side of Mont Saint-Hilaire, Rouville county, Québec |

1535

| | | |
|---|---|---|
| dark reddish chocolate-brown | 8081 | production process: (followed from «caramel-brown [reddish orange tone]») rock irradiated with gamma rays at 602.809 Mrad[1005] |
| dark chocolate-brown (light red tone) | 8082 | production process: 3 g of siderite + 20 ml nitric acid / soaking: 3 d. / drying on hot plate |
| dark reddish chocolate-brown | 8083 | mineral : pyrolusite[101]<br>rock : black (light brown tone), mat<br>powder : black (light brown tone), mat<br>origin : probably Nova Scotia<br><br>mineral : sulphur<br>rock : brilliant yellow<br>powder : brilliant yellow<br>origin : unknown<br><br>production process:<br>2 g of pyrolusite + 2 g of sulphur / 1300 °F / 1 h |
| reddish chocolate-brown darker than «dark reddish chocolate-brown» | 8084 | production process: 2 g of pyrolusite + 2 g of sulphur / 1300 °F / 1 h (dark chocolate-brown [red tone]) / irradiated with gamma[239] rays at 424.7 Mrad[81] |
| chocolate-brown (red reflection) darker and more intense than «reddish chocolate-brown darker than "dark reddish chocolate-brown"» | 8085 | mineral : magnetite<br>rock : dark grey, with metallic brilliance<br>powder : dark grey<br>origin : Fosse du Labrador, Québec<br><br>production process:<br>(followed from «chocolate-brown darker than "dark chocolate-brown"»)<br>0↑1900 °F (dark chocolate-brown) / powder irradiated with gamma[239] rays at 424.7 Mrad |
| | | mineral : hypersthene<br>rock : black |

| | | |
|---|---|---|
| reddish chocolate-brown much darker than «dark reddish chocolate-brown» | 8086 | powder : medium brownish grey<br>origin : Lac Saint-Jean, Québec<br><br>mineral : sulphur<br>rock : brilliant yellow<br>powder : brilliant yellow<br>origin : unknown<br><br><u>production process</u>:<br>2 g of hypersthene + 2 g of sulphur / 1500 °F / 1 h (dark chocolate-brown [red tone]) / irradiated with gamma[239] rays at 64.7 Mrad (followed at «chocolate-brown [light orange tone] darker than "dark orange chocolate-brown"») |
| | | mineral : hypersthene<br>rock : black<br>powder : medium brownish grey<br>origin : Lac Saint-Jean, Québec<br><br><u>production process</u>:<br>2 g of hypersthene + 2 g of sodium carbonate / 0†1600 °F + 1 h at 1600 °F (mixture of particles: brown / olive-green) / irradiated with gamma rays at: |
| very dark chocolate-brown (light red reflection)<br>↓ | 8087 | 64.7 Mrad |
| chocolate-brown less dark and more red | 8088 | 424.7 Mrad |
| chocolate-brown (red tone a bit more accentuated) slightly darker | 8089 | mineral : serandite<br>rock : orange-pink or salmon (with more orange areas)<br>powder : pinkish white<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br><u>production process</u>:<br>2 g of serandite + 2 g of sulphur / 1300 °F / 1 h (very dark chocolate-brown) / irradiated with gamma[239] rays at 424.7 Mrad[81] |

| | | |
|---|---|---|
| than «very dark reddish chocolate -brown» | | |
| chocolate-brown (violet-red tone) | | |
| | | mineral : goethite[106]<br>powder : rusty orange<br>origin : Red Mill, in the suburbs of Cap-de-la -Madeleine, Québec<br><br>mineral : feldspar<br>rock : white, opaque<br>powder : white<br>origin : Baraute, Abitibi, Québec<br><br>mineral : zirconium silicate<br>powder : white (very light yellow reflection)<br>origin : Sial Company, Québec<br><br>production process: |
| dark chocolate-brown (violet-red tone) | 8090 | 0↑1400 °F / slow cooling in furnace (indian red[107]): 1 g + 1 g of feldspar (dark reddish brown [tends towards Burgundy-red]): .50 g + .50 g of sodium carbonate + .50 g of zirconium silicate / 1600 °F / 1 h<br>(followed at «light green») |
| chocolate-brown (orange-red tone) | | |
| | | mineral : crystalline quartz<br>rock : colourless<br>origin : Ferme Adam, Bonsecours, Eastern Townships, Québec<br><br>production process:<br>(followed from «chocolate-brown [reddish orange tone]»)<br>rock irradiated with gamma rays at: |
| chocolate-brown (orange-red tone) | 8091 | 247.6 Mrad[1006] |
| chocolate-brown (orange-red tone) darker than «chocolate-brown (orange-red tone)» | 8092 | 287.3 Mrad |
| dark chocolate-brown (orange-red tone) | 8093 | 360 Mrad[1007] |

| | | |
|---|---|---|
| ↓ | | |
| still darker chocolate-brown (orange-red tone) | 8094 | 424.7 Mrad |
| chocolate-brown (grey tone) | | |
| | | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec |
| chocolate-brown a bit more grey and pale than «light chocolate-brown» | 8095 | <u>production process:</u><br>0↑1600 °F (light milky chocolate-brown) / powder irradiated with gamma[239] rays at 64.7 Mrad (followed at «chocolate-brown [very light orange tone]») |
| | | mineral : quartz<br>rock : light pink, translucid<br>powder : very light grey<br>origin : unknown |
| | | <u>production process:</u><br>(followed from «dark chocolate-brown»)<br>rock irradiated with gamma rays at: |
| greyish chocolate-brown | 8096 | 64.7 Mrad[1008] |
| ↓ | | |
| darker greyish chocolate-brown | 8097 | 102.4 Mrad |
| ↓ | | |
| greyish chocolate-brown equivalent to the previous one | 8098 | 148.4 Mrad |
| ↓ | | |
| darker greyish chocolate-brown | 8099 | 201.6 Mrad |
| ↓ | | |
| still darker greyish chocolate-brown | 8100 | 247.6 Mrad |
| ↓ | | |
| greyish chocolate | 8101 | 287.3 Mrad |

| | | |
|---|---|---|
| -brown equivalent to the previous one | | (followed at «chocolate-brown darker than "dark chocolate-brown"») |
| dark greyish chocolate-brown | 8103 | mineral : olivine<br>rock : light grey, crystalline<br>powder : very light grey<br>origin : Mont Albert, Gaspésie, Québec<br><br><u>production process:</u><br>(followed from «chocolate-brown darker than "chocolate-brown"»)<br>2 g of olivine + 2 g of sodium carbonate / 0↑1900 °F + 1 h at 1900 °F |
| dark greyish chocolate-brown | 8104 | mineral : amethyst<br>rock : violet, translucid<br>powder : light grey (lilac tone)<br>origin : Thunderbay, Ontario<br><br>mineral : sulphur<br>rock : brilliant yellow<br>powder : brilliant yellow<br>origin : unknown<br><br><u>production process:</u><br>.50 g of amethyst + .50 g of sulphur / 1600 °F / 1 h |
| dark greyish chocolate-brown | 8105 | mineral : crocidolite<br>rock : dark greyish blue<br>powder : pale greyish blue<br>origin : Griqualand district, South Africa<br><br><u>production process:</u><br>(followed from «green [considerably soiled by the "rusty brown"]»)<br>4 g of crocidolite + 50 ml nitric acid / soaking: 4 wk. / drying on hot plate (rusty brown / blue) / irradiated with gamma²³⁹ rays at 550.22 Mrad |
| dark greyish chocolate-brown | 8106 | mineral : apatite<br>rock : light grass-green (light blue and yellow tones), very slightly translucid<br>powder : very light grey (light green tone)<br>origin : region of Buckingham, Québec<br><br><u>production process:</u><br>(followed from «pinkish beige»)<br>1000 °C / 1 h (very light pinkish beige or very light beige-pink) / irradiated with gamma rays at |

1540

| | | |
|---|---|---|
| | | 482.984 Mrad |
| | | mineral : chromite<br>rock : blackish grey<br>powder : medium brownish grey<br>origin : Black Lake, near Thetford Mines, Québec<br><br>production process:<br>4 g of chromite + 80 ml nitric acid / soaking: 2 wk. / drying on hot plate (dark brown [light red tone]) / irradiated with gamma[239] rays at 424.7 Mrad[81] |
| dark chocolate-brown (light grey tone) | 8107 | |
| | | mineral : goethite[106]<br>powder : rusty orange<br>origin : Red Mill, in the suburbs of Cap-de-la-Madeleine, Québec<br><br>production process:<br>2 g of goethite + 20 ml of a tartaric solution[35] / soaking: 3 d. / drying on hot plate[1009] |
| dark grayish chocolate-brown | 8109 | |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>(followed from «medium orange [brown tone]») 0↑1400 °F / slow cooling in furnace (indian red[107]): 1.50 g + 1.50 g of feldspar (dark reddish brown): .50 g + .50 g of sulphur + .50 g of titanium dioxide + .50 g of zirconium silicate / depo- |
| dark greyish chocolate-brown | 8110 | |

| | | |
|---|---|---|
| | | sited in a porcelain crucible closed with a cover / the entity is hermetically wrapped in bread dough / 1600 ºF / 1 h |
| dark greyish chocolate-brown | 8111 | mineral : ochre[111]<br>powder : dark reddish brown<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>1 g of ochre + 1 g of zirconium silicate + 1 g of sulphur / 0↑700 ºF<br>(followed at «chocolate-brown more pale than "dark chocolate-brown"») |
| | | mineral : quartz<br>rock : light pink, translucid<br>powder : very light grey<br>origin : unknown<br><br>production process:<br>(followed from «dark chocolate-brown»)<br>rock irradiated with gamma rays at: |
| dark greyish chocolate-brown<br>↓ | 8112 | 64.7 Mrad[1010] |
| dark greyish chocolate-brown, equivalent to the previous one<br>↓ | 8113 | 102.4 Mrad |
| dark greyish chocolate-brown, equivalent to the previous one<br>↓ | 8114 | 148.4 Mrad |
| darker greyish chocolate-brown<br>↓ | 8115 | 201.6 Mrad |
| still darker greyish chocolate-brown<br>↓ | 8116 | 247.6 Mrad |

| | | |
|---|---|---|
| greyish chocolate-brown equivalent to the previous one | 8117 | 287.3 Mrad<br>(followed at «chocolate-brown still darker than "dark chocolate-brown"») |
| dark greyish chocolate-brown | 8118 | mineral : smaltite[25], variety of skutterudite<br>rock : dark iron-grey, with silver metallic brilliance<br>powder : dark grey<br>origin : Cobalt, Ontario<br><br>production process:<br>2 g of smaltite + 2.50 g of sodium carbonate / 0↑1200 °F + 1 h at 1200 °F<br>(followed at «chocolate-brown darker than "dark chocolate-brown"») |
| dark greyish chocolate-brown | 8119 | mineral : stibnite<br>rock : dark grey, with silver and blue metallic brilliance<br>powder : dark grey<br>origin : Consolidated Durham Mine, Saint-Georges, New Brunswick<br><br>production process:<br>(followed from «orange-beige»)<br>1 g of stibnite + 100 ml sulphuric acid / soaking: 2 wk. / drying on hot plate (white [light beige reflection]) / irradiated with gamma rays at 424.7 Mrad |
| very dark greyish chocolate-brown | 8119.1 | mineral : galena<br>rock : dark grey, with metallic brilliance<br>powder : dark grey, with metallic brilliance<br>origin : Trail, British Columbia<br><br>production process:<br>2 g of galena + 5 g of pyrex / manual grinding / heating: 5 °C per min. 0↑1245 °C + maintenance during 1 h / cooling: 5 °C per min. until ambient temperature is reached / the entity is done in ambient air |
| greyish chocolate-brown a bit darker than «very dark greyish chocolate-brown» | 8119.2 | production process:<br>2 g of galena + 5 g of pyrex / manual grinding / heating: 5 °C per min. 0↑1245 °C + maintenance during 1 h / cooling: 5 °C per min. until ambient temperature is reached / the entity is done in ambient air (very dark chocolate-brown [grey tone]) / irradiated with gamma rays at 9.88 Mrad |
| | | mineral : chromite<br>rock : blackish grey |

| | | |
|---|---|---|
| blackish and cold chocolate-brown (grey reflection) | 8120 | powder : medium brownish grey<br>origin : Black Lake, near Thetford Mines, Québec<br><br><u>production process:</u><br>(followed from «chocolate-brown [light orange tone] much darker than "dark chocolate-brown [orange tone]"»)<br>0↑2000 °F (dark chocolate-brown [light orange tone]) / rock irradiated with gamma[239] rays at 424.7 Mrad |
| chocolate-brown (light grey tone) darker than «dark greyish chocolate-brown» | 8121 | mineral : pyrrhotite[276]<br>rock : dark greyish brown, with golden yellow metallic brilliance<br>powder : dark grey<br>origin : Inco Co., Sudbury, Ontario<br><br><u>production process:</u><br>powder irradiated with gamma[239,1011] rays at:<br>64.7 Mrad |
| ↓<br>blackish chocolate-brown (light grey tone) | 8122 | 424.7 Mrad |
| greyish chocolate-brown (violet-pink tone) | | |
| dark greyish chocolate-brown (accentuated violet-pink tone), mat | 8123 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br><u>production process:</u><br>(followed from «dark mat grey [light brown tone]»)<br>1 g of goethite + 1g of sodium carbonate + 1 g of sulphur + 2 g of zirconium silicate / 1600 °F / 1 h<br>(followed at «dark greyish brown») |

| greyish chocolate-brown (orange tone) | | |
|---|---|---|
| medium greyish chocolate-brown (very light orange tone) | 8124 | mineral : peridotite<br>rock : medium grey<br>powder : medium brownish grey (green reflection)<br>origin : Thetford Mines, Québec<br><br>production process:<br>(followed from «medium and pronounced rusty orange»)<br>4 g of peridotite + 100 ml hydrochloric acid / soaking: 2 wk. / separation of the liquid and the solid / drying on hot plate (colour of the solid: medium rusty orange) / irradiated with gamma[228] rays at 424.7 Mrad |
| dark greyish chocolate-brown (very light orange reflection) | 8125 | mineral : actinolite<br>rock : light and cold evergreen<br>powder : light grey (light green tone)<br>origin : erratic block found at Saint-Philémon near Dorchester, Québec<br><br>production process:<br>(followed from «rusty brown»)<br>3 g of actinolite + 50 ml nitric acid / soaking: 2 wk. / separation of the liquid and the solid / drying on hot plate (colour of the liquid: medium rusty orange [brown tone]) / irradiated with gamma[239] rays at 430.4 Mrad |
| dark greyish chocolate-brown (light orange tone) | 8126 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>(followed from «medium brownish grey [violet reflection]»)<br>2 g of goethite + 1 g of sulphur + 1 g of titanium dioxide / 1600 °F / 1 h<br>(followed at «medium brownish grey [violet-pink reflection]») |

| | | |
|---|---|---|
| dark chocolate-brown (light grey tone and localized orange reflection) | 8127 | mineral : sandstone<br>rock : medium pinkish brown (light violet tone)<br>powder : medium pinkish brown (light violet tone)<br>origin : at the rear of Percé, Gaspésie, Québec<br><br>production process:<br>(followed from «pink [brown tone and slight orange tone] [shale type (formation of Sillery)]»)<br>4 g of sandstone + 80 ml nitric acid / soaking: 2 wk./drying on hot plate (dark orange-red [brown tone]) / irradiated with gamma[239] rays at 424.7 Mrad |
| dark greyish chocolate-brown (orange reflection) | 8127.1 | mineral : galena<br>rock : dark grey, with metallic brilliance<br>powder : dark grey, with metallic brilliance<br>origin : Trail, British Columbia<br><br>production process:<br>1 g of galena + 5 g of pyrex / manual grinding / heating: 5 °C per min. 0↑1245 °C + maintenance during 1 h / cooling: 5 °C per min. until ambient temperature is reached / the entity is done in ambient air |
| mossy chocolate-brown | | |
| mossy chocolate-brown | 8128 | mineral : chalcopyrite<br>powder : dark grey (light green tone)<br>origin : Centre de recherche des Mines Noranda in Montréal, Québec<br><br>production process:<br>2 g of chalcopyrite + 2 g of sodium carbonate / 0↑1500 °F + 1 h at 1500 °F<br>(followed at «mossy chocolate-brown [pink tone]») |
| accentuated mossy chocolate-brown | 8129 | mineral : labrador<br>rock : blackish grey<br>powder : medium grey<br>origin : Lac Saint-Jean, Québec<br><br>production process:<br>2 g of labrador + 2 g of sodium carbonate / 0↑1600 °F + 30 min. at 1600 °F (light olive-green) / irradiated with gamma rays at 64.7 Mrad[1012]<br>(followed at «mixture of particles: beige / iron-grey») |
| | | mineral : yofortierite[87] |

| | | |
|---|---|---|
| | | rock : dark chocolate-brown (with pinkish brown areas)<br>powder : dark chocolate-brown<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br>production process:<br>2 g of yofortierite + 2 g of sulphur / 1300 °F / 1 h |
| mossy chocolate-brown a bit lighter than «dark mossy chocolate-brown» | 8130 | |
| dark mossy chocolate-brown | 8131 | mineral : uraninite<br>rock : medium chocolate-brown (red Bordeau tone)<br>powder : medium milky chocolate-brown<br>origin : Yellowknife, Canada<br><br>production process:<br>2 g of uraninite + 2 g of sodium carbonate / 0↑1500 °F + 15 min. at 1500 °F (mixture of particles: olive-green / medium brown) / irradiated with gamma[239] rays at 64.7 Mrad (followed at «medium milky chocolate-brown [grey tone]») |
| mossy chocolate-brown (orange tone) | | |
| medium mossy chocolate-brown (orange tone) | 8132 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>0↑1600 °F (light milky chocolate-brown): .20 g + 50 ml hydrochloric acid / soaking: 2 wk. / drying on hot plate |
| mossy chocolate-brown (pink tone) | | |
| | | mineral : chalcopyrite<br>powder : dark grey (light green tone)<br>origin : Centre de recherche des Mines Noranda |

| | | |
|---|---|---|
| | | in Montréal, Québec<br><br>production process:<br>(followed from «mossy chocolate-brown»)<br>2 g of chalcopyrite + 2 g of sodium carbonate / 0↑1600 °F + 1 h at 1600 °F<br>(followed at «mixture of particles: brown / orange / grey / green») |
| mossy chocolate-brown (pink tone) | 8133 | |
| mossy chocolate-brown (orange-pink tone) | | |
| | | mineral : labrador<br>rock : blackish grey<br>powder : medium grey<br>origin : Lac Saint-Jean, Québec<br><br>production process:<br>2 g of labrador + 2 g of sodium carbonate / 0↑1700 °F + 1 h at 1700 °F (olive-green [yellow tone]) / irradiated with gamma rays at 64.7 Mrad<br>(folowed at «mixture of particles: iron-grey / beige / greyish beige») |
| medium mossy chocolate-brown (very light orange-pink or pinkish orange tone) | 8134 | |
| mossy chocolate-brown (ashen tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «chocolate-brown lighter than "chocolate-brown"» and «chocolate-brown»)<br>2 g of goethite + 12 g of sulphur / 600 °F / 1 h<br>(followed at «brown [very light orange tone]» and «chocolate-brown lighter than "chocolate-brown"») |
| light mossy chocolate-brown (ashen tone) | 8135 | |
| burnt umber[1280] | | |
| | | mineral : orpiment<br>rock : vivid yellow (orange tone)<br>powder : vivid yellow (orange tone)<br>origin : Nevada, United States<br><br>production process:<br>(followed from «medium beige»)<br>2 g of orpiment + 5 g of pyrex / manual grinding / heating: 5 °C per min. 0↑1245 °C + maintenance du- |
| burnt umber [between «medium» | 8135.1 | |

| | | |
|---|---|---|
| and «dark» burnt umber], milky | | ring 1 h / cooling: 5 °C per min. until ambient temperature is reached / the entity is done in ambient air (milky white) / irradiated with gamma rays at 9.88 Mrad |
| burnt umber [between «medium» and «dark» burnt umber] | 8135.2 | mineral : selenium<br>powder : dark metallic grey<br>origin : Minéraux Noranda Inc., lot 3847, Montréal, Québec<br><br><u>production process:</u><br>(followed from «medium caramel-beige [pinkish orange tone]»)<br>3 g of selenium + 5 g of pyrex / manual grinding / heating: 5 °C per min. 0↑1245 °C + maintenance during 1 h / cooling: 5 °C per min. until ambient temperature is reached / the entity is done in ambient air (very, very light yellowish beige) / irradiated with gamma rays at 9.88 Mrad |
| burnt umber [between «medium» and «dark» burnt umber] | 8135.3 | mineral : selenium<br>powder : dark metallic grey<br>origin : Minéraux Noranda Inc., lot 3847, Montréal, Québec<br><br><u>production process:</u><br>approximately 150 g of molten glass (sodalime) is «collected» at the state of fusion in a furnace (1200 °C) on a metal rod / 1 g of selenium is sprinkled at the surface of the glass / then, the entity is put again in the furnace and melted at the flame at 1200 °C / then, the «collect» is removed from the metal rod (transparent white [with iron-grey particles]) / irradiated with gamma rays at:<br>2.47 Mrad |
| ¦ | | |
| darker burnt umber | 8135.4 | 4.94 Mrad |
| ¦ | | |
| still darker burnt umber | 8135.5 | 7.41 Mrad |
| ↓ | | |
| still darker burnt umber | 8135.6 | 9.88 Mrad |
| | | <u>production process:</u><br>2 independent masses of 150 g of molten glass (sodalime) are collected, at the state of fusion (1200 °C) in a furnace on 2 independent metal rods / 2 g of selenium are sprinkled at the |

1549

| | | |
|---|---|---|
| | | surface of only one side of one of the 2 «collects» which is then covered with the other «collect» / thus, the 2 surfaces are joined, imprisoning the selenium in a sandwich between the 2 «collects» of glass / the entity is put again in the furnace and heated with the flame at 1200 °C to make a whole / the resulting «collect» is removed from the metal rods (very, very light pink) / deposited on a ceramic plate at the state of a biscuit / heating in a furnace in ambient air 0↑1000 °C / the furnace is then put off / slow cooling in the furnace (transparent white [with iron-grey particles in suspension in the glass]) / irradiated with gamma rays at: |
| burnt umber [between «medium» and «dark» burnt umber] | 8135.7 | 2.47 Mrad |
| ↓ | | |
| darker burnt umber | 8135.8 | 4.94 Mrad |
| ↓ | | |
| still darker burnt umber | 8135.9 | 7.41 Mrad |
| ↓ | | |
| still darker burnt umber | 8135.10 | 9.88 Mrad |
| | | <u>production process:</u> 2 independent masses of 150 g of molten glass (sodalime) are collected at the state of fusion (1200 °C) in a furnace on 2 independent metal rods / .45 g of selenium are sprinkled at the surface of only one side of one of these 2 «collects», which is then covered by the other «collect» / thus, the 2 surfaces are joined, imprisoning the selenium in a sandwich between the 2 «collects» of glass / the entity is put back again in the furnace and melted again with the flame at 1200 °C to make an entity / the resulting «collect» is then removed from the metal rods (transparent white [with iron-grey particles in suspension in the glass]) / deposited on a ceramic plate at the state of a biscuit / heating in the furnace in ambient air 0↑1000 °C / the furnace is put off / cooling in furnace (transparent white [with iron-grey particles in suspension in the glass]) / |

| | | |
|---|---|---|
| | | irradiated with gamma rays at: |
| burnt umber [between «medium» and «dark» burnt umber] | 8135.11 | 2.47 Mrad |
| ↓ | | |
| darker burnt umber | 8135.12 | 4.94 Mrad |
| ↓ | | |
| still darker burnt umber | 8135.13 | 7.41 Mrad |
| ↓ | | |
| still darker burnt umber | 8135.14 | 9.88 Mrad |
| | | mineral : tellurium<br>powder : dark metallic grey<br>origin : Minéraux Noranda Inc., lot 64, Montréal, Québec<br><br><u>production process</u>:<br>approximately 150 g of molten glass (sodalime) is «collected» at the state of fusion in a furnace (1200 °C) on a metal rod / .45 g of tellurium is sprinkled at the surface of the glass / then, the entity is put back in the furnace and melted with the flame at 1200 °C / then, the «collect» is removed from the metal rod (glaze: light and milky cream [yellow tone] , mat and translucent like frosted glass) / deposited on a ceramic plate at the state of a biscuit / heating in a furnace in ambient air 0↑1000 °C / the furnace is turned off / slow cooling in the furnace (transparent white, slightly milky at the surface) / irradiated with gamma rays at: |
| burnt umber [between «medium» and «dark» burnt umber] | 8135.15 | 2.47 Mrad |
| ↓ | | |
| darker burnt umber | 8135.16 | 4.94 Mrad |
| ↓ | | |
| darker burnt umber | 8135.17 | 7.41 Mrad |

| | | |
|---|---|---|
| ↓<br>darker burnt umber | 8135.18 | 9.88 Mrad |
| | | production process:<br>approximately 150 g of molten glass (sodalime) is «collected» at the state of fusion in a furnace (1200 °C) on a metal rod / 1 g of tellurium is sprinkled at the surface of the glass / then, the entity is put back in the furnace and melted with the flame at 1200 °C / then, the «collect» is removed from the metal rod (glaze: light and milky cream [yellow tone], mat and translucent as frosted glass) / deposited on a ceramic plate at the state of a biscuit / heating in a furnace in ambient air 0↑1000 °C / the furnace is turned off / slow cooling in furnace (transparent white, slightly milky at the surface) / irradiated with gamma rays at: |
| burnt umber [between «medium» and «dark» burnt umber] | 8135.19 | 2.47 Mrad |
| ↓<br>darker burnt umber | 8135.20 | 4.94 Mrad |
| ↓<br>still darker burnt umber | 8135.21 | 7.41 Mrad |
| ↓<br>still darker burnt umber | 8135.22 | 9.88 Mrad |
| dark burnt umber | 8135.23 | production process:<br>2 g of tellurium + 6.50 g of glass powder (spruce pine batch) / manual grinding / deposited on a ceramic plate at the state of a biscuit / heating in a furnace 0↑1000 °C in ambient air / slow cooling in furnace (3 areas: light lemon-yellow / greyish brown / transparent white, slightly milky) / irradiated with gamma rays at 7.41 Mrad |
| burnt umber (caramel tone) | | |
| | | mineral : sulphur<br>rock : brilliant yellow<br>powder : brilliant yellow<br>origin : unknown<br><br>production process:<br>approximately 150 g of molten glass (sodalime) is «collected» at the state of fusion in a furnace (1200 °C) on a metal rod / 1 g of sulphur is |

| | | |
|---|---|---|
| | | sprinkled at the surface of the glass / then, the entity is put back in the furnace and melted with the flame at 1200 °C / then, the «collect» is removed from the metal rod (transparent white, particularly clear) / deposited on a ceramic plate at the state of a biscuit / heating in furnace in ambient air 0↑1000 °C / the furnace is turned off / slow cooling in furnace (transparent white, particularly clear) / irradiated with gamma rays at: |
| medium burnt umber (caramel tone) | 8135.24 | 2.47 Mrad |
| ↓ | | |
| darker burnt umber (caramel tone) | 8135.25 | 4.94 Mrad |
| ↓ | | |
| still darker burnt umber (caramel tone) | 8135.26 | 7.41 Mrad |
| ↓ | | |
| still darker burnt umber (caramel tone) | 8135.27 | 9.88 Mrad |

GREY (BROWN TONE)

| colour obtained | number | mineral / production process |
|---|---|---|
| pale greyish brown | 8136 | mineral : cerite<br>rock : dark brownish grey<br>powder : light grey (light brown tone)<br>origin : Jamestown, Boulder county, Colorado, United States<br><br>production process:<br>2 g of cerite + 2 g of sodium carbonate / 0↑1300 °F + 1 h at 1300 °F (beige [brown tone], with blue particles) / irradiated with gamma rays at 424.7 Mrad[81] |
| pale greyish brown | 8137 | mineral : halite[41]<br>rock : colourless<br>powder : colourless<br>origin : Seleine Mine, Iles-de-la-Madeleine, Québec<br><br>production process:<br>rock hermetically wrapped in bread dough / 1500 °F / 1 h (white more opaque than «colourless») / irradiated with gamma rays at 64.7 Mrad[1013] (followed at «very dark greyish brown, almost black») |
| pale greyish brown (light copper reflection) | 8138 | mineral : steatite<br>rock : light cold grey, slightly translucid<br>powder : light grey<br>origin : East Broughton, Québec<br><br>production process:<br>(followed from «light orange-brown» and «beige [orange-pink tone]»)<br>0↑2300 °F |
| | | mineral : ochre[128]<br>powder : black<br>origin : Red Mill, in the suburbs of Cap-de-la-Madeleine, Québec |

1554

| | | |
|---|---|---|
| pale greyish brown | 8139 | mineral : zirconium silicate<br>powder : white (very light yellow reflection)<br>origin : Sial Company, Québec<br><br><u>production process:</u><br>1 g of ochre + 1 g of zirconium silicate / 0↑700 °F<br>(followed at «medium orange-brown») |
| very light greyish brown or brownish grey | 8140 | mineral : gypsum<br>rock : white (yellow reflection)<br>powder : white (yellow reflection)<br>origin : Beisborough, Nova Scotia<br><br><u>production process:</u><br>2 g of gypsum + 20 ml hydrochloric acid / soaking: 3 d. / drying on hot plate (chalk-white [light yellow reflection]: .3 g + 50 cc of transparent polyester resin + 1% of catalyst / manual grinding / moulding / hardening (very, very light yellow) / irradiated with electrons at 155,082 rad<br>(followed at «greyish green or brownish green») |
| light greyish brown | 8141 | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br><u>production process:</u><br>(followed from «dark brown [violet-red tone]»)<br>250 g of crocidolite + 1650 ml hydrochloric acid in a 2000 ml becher <u>or</u> crocidolite entirely covered with hydrochloric acid in vertical container / soaking: 1 wk. / drying on hot plate (formation of 2 superimposed layers of colours, the one at bottom being: dark green [light yellow tone]): 2 g + 6 g of sulphur / 1300 °F / 1 h730<br>(followed at «light pinkish brown») |
| | | mineral : apatite<br>rock : pale brownish green<br>powder : very light greyish green<br>origin : Black Lake, Thetford county, Québec |

1555

| | | |
|---|---|---|
| light greyish brown or brownish grey | 8142 | production process:<br>.30 g of apatite + 50 cc of transparent polyester resin + 1% of catalyst / manual grinding / moulding / hardening (very, very light grey) / irradiated with electrons at 305,082 rad[354] |
| light greyish brown | 8143 | mineral : bauxite[92]<br>powder : pinkish beige, mat<br>origin : Alcan Company, French Guyana<br><br>production process:<br>3 g of bauxite + 20 ml hydrofluoric acid / soaking: 24 h / drying in drying oven at 100 °F (light brown-grey) / irradiated with gamma rays at 64.7 Mrad<br>(followed at «medium greyish beige») |
| light greyish brown or brownish grey | 8144 | mineral : beryl<br>rock : light blue, slightly translucid<br>powder : light grey<br>origin : Abitibi, Québec<br><br>production process:<br>.3 g of beryl + 50 cc of transparent polyester resin + 1% of catalyst / manual grinding / moulding / hardening (very light grey) / irradiated with electrons at 155,082 rad<br>(followed at «light grey [greenish yellow reflection]») |
| light greyish brown | 8145 | mineral : calcite<br>rock : light pink<br>powder : pinkish white<br>origin : Huddersfield district, Pontiac county, Québec<br><br>production process:<br>.3 g of calcite + 50 cc of transparent polyester resin + 1% of catalyst / manual grinding / moulding / hardening (very, very light grey) / irradiated with electrons at 155,082 rad<br>(followed at «greenish grey») |
| light greyish | 8146 | mineral : dolomite<br>rock : white (localized yellow reflection), crystalline and translucid<br>powder : white<br>origin : Bristol district, Pontiac county, Québec<br><br>production process:<br>.3 g of dolomite + 50 cc of transparent polyester |

| | | |
|---|---|---|
| brown | | resin + 1% of catalyst / manual grinding / moulding / hardening (very, very light greenish grey) / irradiated with electrons at 155,082 rad (followed at «greyish green darker than "greyish green"») |
| light greyish brown or brownish grey | 8147 | mineral : fluorine<br>rock : colourless<br>powder : colourless<br>origin : unknown<br><br>production process:<br>2 g of fluorine + 25 ml nitric acid / soaking: 24 h / drying on hot plate (light grey): .3 g + 50 cc of transparent polyester resin + 1% of catalyst / manual grinding / moulding / hardening (very light grey) / irradiated with electrons at 305,082 rad[354] |
| light greyish brown | 8147.1 | mineral : graphite<br>rock : dark grey, with metallic brilliance<br>powder : dark grey, with metallic brilliance<br>origin : Grenville, Québec<br><br>production process:<br>1 g of graphite + 5 g of pyrex / manual grinding / heating: 5 °C per min. 0↑1245 °C + maintenance during 1 h / cooling: 5 °C per min. until ambient temperature is reached / the entity is done in ambient air |
| light greyish brown | 8148 | mineral : obsidian<br>rock : very dark smoky grey, almost black<br>powder : light grey<br>origin : Arkansas, United States<br><br>production process:<br>2 g of obsidian + 2 g of sodium carbonate / 0↑1300 °F + 1 h at 1300 °F (followed at «orange-brown») |
| light greyish | 8149 | mineral : ochre[20]<br>powder : orange<br>origin : small copper and nickel deposit, in the South-Western area of a mass of serpentinite at 3 km at the West of Saint-Fabien-de-Panet, Québec<br><br>production process:<br>3 g of ochre + 20 ml hydrofluoric acid / soaking: |

1557

| | | |
|---|---|---|
| brown | | 24 h / drying in drying oven at 100 °F (light grey): .3 g + 50 cc of transparent polyester resin + 1% of catalyst / manual grinding / moulding / hardening (light grey [light yellow reflection]) / irradiated with electrons at 155,082 rad (followed at «grey [yellowish green reflection]») |
| light greyish brown | 8150 | mineral : milky quartz<br>rock : milky white, translucid<br>powder : orange<br>origin : small copper and nickel deposit, in the South-Western area of a mass of serpentinite at 3 km at the West of Saint-Fabien-de-Panet, Québec<br><br>production process:<br>(followed from «light cold grey»)<br>rock irradiated with gamma rays at 424.7 Mrad |
| light greyish brown | 8151 | mineral : sardonyx<br>rock : white, slightly translucid (with a light orange-amber circular area on the surface)<br>powder : very light grey<br>origin : unknown<br><br>production process:<br>(followed from «light beige»)<br>4 g of sardonyx + 40 ml hydrochloric acid / soaking: 14 d. / separation of the liquid and the solid / drying on hot plate (colour of the solid: very light pinkish beige [with green particles]) / irradiated with electrons at 305,200 rad[73] |
| light greyish brown | 8152 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>2 g of silica + 2 g of sodium carbonate / 0↑1800 °F + 1 h at 1800 °F (apple-green) / irradiated with gamma rays at 63.88 Mrad (followed at «medium olive-green») |
| | | mineral : asbestos[4] |

| | | |
|---|---|---|
| light greyish brown | 8152.1 | rock : dark grey (green reflection)<br>powder : light grey (green reflection)<br>origin : Asbestos Corporation Ltd., Thetford Mines, Québec<br><br>production process:<br>1 g of asbestos + 6.50 g of glass powder (spruce pine batch) / manual grinding / deposited on a ceramic plate at the state of a biscuit / heating in a furnace 0↑1000 °C in ambient air[1276] |
| greyish brown a bit darker [brown] than «light greyish brown»<br>↓ | 8153 | production process:<br>0↑1600 °F (orange-chamois): 1 g + 1 cc of white transparent printing ink / mechanical grinding / 1 impression on glazed white paper (light and cold greyish brown) / irradiated with gamma rays at:<br>5.7 Mrad[1015] |
| greyish brown a bit more beige<br>↓ | 8154 | 17.91 Mrad |
| greyish brown still more beige | 8155 | 22.8 Mrad |
| greyish brown a bit darker than «light greyish brown» | 8156 | mineral : anorthosite<br>rock : light grey<br>powder : very, very light greyish beige<br>origin : rang Sainte-Germaine, Oka, Québec<br><br>production process:<br>powder irradiated with electrons at 162,431 rad |
| greyish brown darker than «light greyish brown» | 8157 | mineral : agate<br>rock : grey (with a light orange circular area on the surface), slightly translucid<br>powder : very light grey<br>origin : unknown<br><br>production process:<br>(followed from «brownish grey (blue reflection) darker than "light brownish grey (blue reflection)"»)<br>the «grey, translucent» center of the rock is irradiated with gamma rays at 360 Mrad<br>(followed at «medium greyish brown») |

| | | |
|---|---|---|
| | | mineral : sericite shale<br>rock : light grey (green reflection)<br>powder : very, very light grey<br>origin : Magog, Québec<br><br>mineral : sulphur<br>rock : brilliant yellow<br>powder : brilliant yellow<br>origin : unknown<br><br>production process: |
| greyish brown darker than «light greyish brown» | 8158 | 2 g of shale + 2 g of sulphur / 1300 °F / 1 h (light grey [light brown tone]) / irradiated with gamma rays at 64.7 Mrad (followed at «medium greyish brown [very light orange reflection]») |
| | | mineral : obsidian<br>rock : very dark smoky grey, almost black<br>powder : light grey<br>origin : Arkansas, United States<br><br>production process:<br>2 g of obsidian + 2 g of sodium carbonate / 0↑1300 °F + 1 h at 1300 °F (light greyish brown) / irradiated with gamma rays at: |
| greyish brown much darker than «light greyish brown» | 8159 | 64.7 Mrad |
| ↓ | | |
| greyish brown a bit darker | 8160 | 424.7 Mrad |
| | | mineral : pyrite<br>rock : pale brass-yellow, with metallic brilliance<br>powder : brownish grey (with golden yellow particles)<br>origin : Noranda Mines, Noranda, Abitibi, Québec<br><br>production process:<br>powder irradiated with gamma[228] rays at: |
| greyish brown lighter than «greyish brown» | 8161 | 64.7 Mrad |
| ↓ | | |
| greyish brown lighter than «greyish brown» | 8162 | 424.7 Mrad[1016] |
| | | mineral : blue lace agate<br>rock : light violet-blue, slightly translucid |

| | | |
|---|---|---|
| greyish brown | 8163 | powder : very light grey<br>origin : Africa<br><br>production process:<br>3 g of agate + 40 ml sulphuric acid / soaking: 18 d. / drying on hot plate (very light grey) / irradiated with gamma rays at 425.65 Mrad[1017] |
| greyish brown | 8164 | mineral : agate<br>rock : grey (with a light orange circular area on the surface), slightly translucid<br>powder : very light grey<br>origin : unknown<br><br>production process:<br>3 g of agate + 40 ml phosphoric acid / soaking: 2 wk. / drying on hot plate (still humid) / colour of the solid[37] |
| greyish brown or brownish grey | 8165 | mineral : apophyllite<br>rock : milky white, translucid<br>powder : white<br>origin : Gaspé Copper Mine, Gaspé, Québec<br><br>production process:<br>(followed from «pinkish grey [beige tone]»)<br>powder irradiated with gamma rays at 424.7 Mrad[1018] |
| greyish brown | 8166 | mineral : calcite[11]<br>powder : white<br>origin : Calcite du Nord Company, Saint-Eugène de Mistassini, Lac Saint-Jean, Québec<br><br>mineral : chromite[294]<br>rock : dark grey<br>powder : dark grey<br>origin : Black Lake, Eastern Townships, Québec<br><br>production process:<br>(followed from «brown»)<br>1.50 g of calcite + .50 g of chromite / 600 °C / 2 h<br>(followed at «light grey») |
| | | mineral : cement[269]<br>powder : medium brownish grey<br>origin : CALCO, Charlesbourg, Québec<br><br>mineral : chrome |

1561

| | | |
|---|---|---|
| | | powder : light grey, with metallic brilliance<br><br><u>production process:</u><br>(followed from «dark grass-green») |
| greyish brown | 8167 | 1.50 g of cement + .50 g of chrome / 2450 °F / 1 h |
| | | mineral : cement[82]<br>powder : medium cold grey<br>origin : Union des Carrières, Limoilou, Québec<br><br>mineral : chrome<br>powder : light grey, with metallic brilliance<br><br><u>production process:</u><br>(followed from «greenish brown [still more brown than "greenish brown"]») |
| greyish brown | 8168 | 1.50 g of cement + .50 g of chrome / 2300 °F / 1 h<br>(followed at «blackish brown») |
| | | mineral : chromite[294]<br>rock : dark grey<br>powder : dark grey<br>origin : Black Lake, Eastern Townships, Québec<br><br>mineral : cement[269]<br>powder : medium brownish grey<br>origin : CALCO, Charlesbourg, Québec<br><br><u>production process:</u><br>(followed from «brown») |
| greyish brown | 8169 | 1.50 g of cement + .50 g of chromite / 600 °C / 2 h<br>(followed at «light grey») |
| | | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br><u>production process:</u><br>(followed from «brown») |
| greyish brown | 8170 | 1.50 g of cement + .50 g of chromite / 600 °C / 2 h<br>(followed at «light grey») |
| | | mineral : corundum<br>rock : medium grey |

1562

| | | |
|---|---|---|
| | | powder : light grey<br>origin : Transvaal, Africa<br><br><u>production process:</u><br>(followed from «brownish grey»)<br>rock irradiated with gamma rays at: |
| greyish brown | 8171 | 102.4 Mrad |
| ↓ | | |
| darker greyish brown [brown] | 8172 | 122.984 Mrad |
| ↓ | | |
| still darker greyish brown [brown] | 8173 | 148.4 Mrad |
| ↓ | | |
| still darker greyish brown [brown] | 8174 | 201.6 Mrad |
| ↓ | | |
| darker greyish brown [brown] | 8175 | 247.6 Mrad |
| ↓ | | |
| still darker greyish brown [brown] | 8176 | 287.3 Mrad[1019]<br>(followed at «dark chocolate-brown») |
| | | mineral : clay<br>block : pale greyish green<br>powder : pale greyish green<br>origin : bank of Saint-Lawrence river at the rear of the Miguasha Museum, Gaspésie, Québec<br><br><u>production process:</u> |
| greyish brown | 8177 | 1 g of clay + 50 ml phosphoric acid / soaking: 2 wk. / drying on hot plate (still humid) / colour of the liquid[160] |
| | | mineral : granite gneiss<br>rock : reddish beige<br>powder : medium pink (light brown tone)<br>origin : Lac Beauport, region of the city of Québec, Québec<br><br><u>production process:</u> |
| greyish brown | 8178 | 0↑1900 °F (medium beige): 1 g + 80 ml phosphoric acid / soaking: 2 wk. / drying on hot plate during 3 wk. (still humid) / colour of the liquid[1020] |
| | | mineral : almandite<br>rock : dark brownish red<br>powder : medium brownish red<br>origin : Gore Mountain, Warren county, state of New York, United States |

1563

| | | |
|---|---|---|
| greyish brown | 8179 | production process:<br>(followed from «blackish brown»)<br>2 g of almandite + 2 g of sodium carbonate /<br>0↑1900 °F + 1 h at 1900 °F |
| | | mineral : halite[41]<br>rock : colourless<br>powder : colourless<br>origin : Seleine Mine, Iles-de-la-Madeleine, Québec<br><br>production process:<br>(followed from «dark brownish grey»)<br>rock irradiated with gamma rays at: |
| greyish brown | 8180 | 131.16 Mrad[1021] |
| ↓ | | |
| greyish brown | 8181 | 136.02 Mrad |
| ↓ | | |
| greyish brown | 8182 | 148.4 Mrad |
| ↓ | | |
| greyish brown | 8183 | 195.02 Mrad<br>(followed at «reddish brown») |
| | | production process:<br>(followed at «amber-grey»)<br>powder[1022] filtered at 14 meshes and irradiated with gamma rays at: |
| greyish brown | 8184 | 124.704 Mrad |
| ↓ | | |
| greyish brown | 8185 | 131.16 Mrad |
| ↓ | | |
| greyish brown | 8186 | 136.02 Mrad |
| ↓ | | |
| greyish brown | 8187 | 141.02 Mrad |
| ↓ | | |
| greyish brown | 8188 | 146.02 Mrad |
| ↓ | | |
| greyish brown | 8189 | 193.6 Mrad<br>(followed at «reddish brown») |
| | | production process:<br>(followed from «amber-grey»)<br>powder[1022] filtered at 42 meshes and irradiated with gamma rays at: |
| greyish brown | 8190 | 124.704 Mrad |
| ↓ | | |
| greyish brown | 8191 | 131.16 Mrad |
| ↓ | | |
| greyish brown | 8192 | 136.02 Mrad |
| ↓ | | |
| greyish brown | 8193 | 141.02 Mrad |

| | | |
|---|---|---|
| greyish brown<br>↓ | 8194 | 146.02 Mrad |
| greyish brown | 8195 | 193.6 Mrad<br>(followed at «reddish brown») |
| greyish brown | 8196 | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>2 g of ilmenite + 2 g of sodium carbonate / 0↑1300 °F + 1 h at 1300 °F<br>(followed at «brown [light orange tone]») |
| greyish brown | 8197 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>rock hermetically wrapped in bread dough / irradiated with gamma rays at 5.7 Mrad |
| greyish brown<br>↓ | 8198 | production process:<br>(followed from «light violet-brown tint [grey reflection]»)<br>granules[1023] irradiated with gamma rays at:<br>102.4 Mrad |
| greyish brown<br>↓ | 8199 | 148.4 Mrad |
| greyish brown | 8200 | 201.6 Mrad<br>(followed at «light caramel-brown [grey reflection]») |
| 2 areas: the center is greyish brown; the perimeter is light beige | 8201 | mineral : quartz (with impurities of white kaolinite)<br>rock : opaline white, slightly translucid<br>origin : quarry near Saint-Rémi d'Amherst, Québec<br><br>production process:<br>1600 °F / 1 h (white [grey reflection]) / rock irradiated with gamma rays at 64.7 Mrad<br>(followed at «brownish grey of various tones») |
| | | mineral : quartz<br>rock : light pink, translucid<br>powder : very light grey |

| | | |
|---|---|---|
| greyish brown | 8202 | origin : unknown<br><br>production process:<br>1600 °F / 1 h (semiopaque white) / rock irradiated with gamma rays at 64.7 Mrad<br>(followed at «iron-grey [between "dark and medium iron-grey"») |
| greyish brown | 8203 | production process:<br>4 g of quartz + 40 ml phosphoric acid / soaking: 2 wk. / drying on hot plate (still humid) / colour of the solid[901] |
| greyish brown or brownish grey | 8204 | mineral : tremolite<br>rock : medium brown (evergreen tone)<br>powder : greyish beige<br>origin : Tetreault Mine, Montauban, Portneuf county, Québec<br><br>production process:<br>2 g of tremolite + 2 g of sodium carbonate / 0↑1000 °F + 1 h at 1000 °F[1073]<br>(followed at «light orange-beige») |
| greyish brown | 8205 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «pinkish beige [grey tone]»)<br>0↑2000 °F |
| greyish brown<br>↓<br>darker greyish brown | 8206<br><br>8207 | mineral : dolomite<br>rock : light grey<br>powder : light grey<br>origin : Shefferville, Ungava, Québec<br><br>production process:<br>(followed from «light greyish beige»)<br>rock irradiated with gamma rays at:<br>287.3 Mrad[1024]<br><br>360 Mrad<br>(followed at «medium orange-brown») |
| | | mineral : olivine<br>powder : colourless (green reflection)<br>origin : Mount Haven, United States |

1566

| | | |
|---|---|---|
| greyish brown or brownish grey darker than «greyish brown» | 8208 | production process:<br>1 g of olivine + 1 cc of white transparent printing ink / mechanical grinding / 8 superimpositions on white glazed paper (greyish brown or brownish grey) / irradiated with gamma rays at:<br>11.4 Mrad[89,1025] |
| ↓ greyish brown or brownish grey a bit more grey | 8209 | 22.8 Mrad |
| greyish brown darker than «greyish brown» | 8210 | mineral : andulusite<br>rock : light brownish grey<br>powder : light grey<br>origin : Bimbowrie, South Australia<br><br>production process:<br>(followed from «beige-grey darker than "light beige-grey"»)<br>powder irradiated with gamma rays at 190.22 Mrad<br><br>(followed at «pale caramel-brown») |
| greyish brown darker than «greyish brown» | 8211 | mineral : haematite<br>rock : medium chocolate-brown<br>powder : medium chocolate-brown<br>origin : Nouveau Québec, Québec<br><br>production process:<br>0↑1800 °F (dark violet-brown): 4 g + 100 ml sulphuric acid / soaking: 2 wk. / drying on hot plate (iron-grey) / irradiated with gamma rays at 64.7 Mrad<br>(followed at «mixture of particles: cream / brownish grey») |
| greyish brown (with golden particles), darker than «greyish brown» ¦ | 8212 | mineral : iron pyrite<br>powder : greyish brown, with golden yellow metallic brilliance<br>origin : Rigaud seigniory, Beauce county, Québec<br><br>production process:<br>powder irradiated with gamma[239] rays at:<br>5 Mrad |

| | | |
|---|---|---|
| darker greyish brown (with golden particles) | 8213 | 10 Mrad |
| ↓ | | |
| still darker greyish brown (with golden particles) | 8214 | 57.4 Mrad |
| ↓ | | |
| darker and more brown greyish brown | 8215 | 64.7 Mrad |
| ↓ | | |
| still darker and more brown greyish brown | 8216 | 65.704 Mrad[1026] |
| ↓ | | |
| a bit darker and more brown greyish brown | 8217 | 102.4 Mrad |
| ↓ | | |
| still a bit darker and more brown greyish brown | 8218 | 124.704 Mrad |
| ↓ | | |
| a bit darker and more brown greyish brown | 8219 | 148.4 Mrad |
| ↓ | | |
| still a bit darker and more brown greyish brown | 8220 | 201.6 Mrad |
| ↓ | | |
| a bit darker and more brown greyish brown | 8221 | 247.6 Mrad |
| ↓ | | |
| a bit darker and more brown greyish brown | 8222 | 287.3 Mrad |
| ↓ | | |
| a bit darker and more brown greyish brown | 8223 | 360 Mrad |
| ↓ | | |
| a bit darker and more brown greyish brown | 8224 | 424.7 Mrad[1027] |
| | | mineral : galena<br>rock : dark grey, with metallic brilliance<br>powder : dark grey, with metallic brilliance<br>origin : Trail, British Columbia<br><u>production process:</u><br>(followed from «grey a bit darker than "medium |

1568

| | | |
|---|---|---|
| greyish brown lighter than «medium greyish brown» | 8225 | grey"») 1300 °F / 1 h (medium grey) / powder irradiated with gamma rays at 122.984 Mrad (followed at «greyish brown a bit darker than "medium greyish brown"») |
| medium greyish brown | 8226 | mineral : agate<br>rock : grey (with a light orange circular area on the surface), slightly translucid<br>powder : very light grey<br>origin : unknown<br><br>production process:<br>(followed from «greyish brown darker than "light greyish brown"»)<br>the translucent grey center of the rock is irradiated with gamma rays at 424.7 Mrad[1028] |
| medium greyish brown | 8226.1 | mineral : sphalerite[27]<br>rock : dark grey, with golden yellow metallic brilliance<br>powder : dark brownish grey<br>origin : Matagami Mine, Matagami, Québec<br><br>production process:<br>1 g of sphalerite + 6.50 g of glass powder (spruce pine batch) / manual grinding / deposited on a ceramic plate at the state of a biscuit / heating in a furnace 0↑1000 °C in ambient air / slow cooling in furnace |
| medium greyish brown | 8227 | mineral : bauxite[92]<br>powder : pinkish beige, mat<br>origin : Alcan Company, French Guyana<br><br>mineral : sulphur<br>rock : brilliant yellow<br>powder : brilliant yellow<br>origin : unknown<br><br>production process:<br>1 g of bauxite + 1 g of sodium carbonate + 1 g of sulphur / 1700 °F / 1 h |
| | | mineral : bornite<br>rock : reddish brown (with localized green and bluish green oxidation)<br>powder : reddish brown<br>origin : Lac Musset, Fosse du Labrador, Québec<br><br>production process:<br>(followed from «light brown») |

| | | |
|---|---|---|
| medium greyish brown | 8228 | 1500 °F / 1 h (medium reddish brown): 1 g + 40 ml hydrochloric acid / soaking: 14 d. / separation of the liquid and the solid / natural drying (colour of the solid: light green) / irradiated with gamma rays at 425.65 Mrad |
| medium greyish brown | 8229 | mineral : corundum<br>rock : medium grey<br>powder : light grey<br>origin : Transvaal, Africa<br><br>production process:<br>0↑1900 °F (brownish grey): 1 g + 50 ml nitric acid / soaking: 2 wk. / drying on hot plate |
| medium greyish brown | 8230 | mineral : galena<br>rock : dark grey, with metallic brilliance<br>powder : dark grey, with metallic brilliance<br>origin : Gisement Sullivan, COMINCO Co., Co-Trail, British Columbia<br><br>mineral : sulphur<br>rock : brilliant yellow<br>powder : brilliant yellow<br>origin : unknown<br><br>production process:<br>2 g of galena + 2 g of sulphur / 1300 °F / 1 h (apple-green) / irradiated with gamma rays at 424.7 Mrad[81] |
| medium greyish brown | 8231 | mineral : galena<br>rock : dark grey, with metallic brilliance<br>powder : dark grey, with metallic brilliance<br>origin : Trail, British Columbia<br><br>production process:<br>20 g of galena + 100 ml sulphuric acid / soaking: 24 h / drying on hot plate |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : cement[1138]<br>powder : white |

| | | |
|---|---|---|
| medium greyish brown | 8232 | production process:<br>(followed from «medium milky chocolate-brown [grey tone]»)<br>0↑1400 °F / slow cooling in furnace (indian red[107]): 1.50 g + 1.50 g of feldspar (dark reddish brown): 1 g + 4.50 g of cement + 3 cc of water / manual grinding / moulding / hardening / 0↑1900 °F |
| medium greyish brown | 8233 | mineral : honey grossular garnet<br>rock : light pinkish beige<br>powder : very light beige<br>origin : Jeffrey Mine, Asbestos (presently J.-M. Asbestos), Québec<br><br>production process:<br>1 g of garnet + 1 g of sodium carbonate / 1600 °F / 1 h |
| medium greyish brown | 8233.1 | production process:<br>1 g of garnet + 5 g of pyrex / manual grinding / heating: 5 °C per min. 0↑1245 °C + maintenance during 1 h / cooling: 5 °C per min. until ambient temperature is reached / the entity is done in ambient air |
| medium greyish brown | 8234 | mineral : labrador<br>rock : blackish grey<br>powder : medium grey<br>origin : Lac Saint-Jean, Québec<br><br>production process:<br>(followed from «medium orange-brown»)<br>powder irradiated with gamma rays at 424.7 Mrad |
| medium greyish brown | 8235 | production process:<br>2 g of labrador + 25 ml nitric acid / soaking: 3 d. / drying on hot plate |
| medium greyish brown | 8236 | mineral : labrador<br>rock : blackish grey<br>powder : medium grey<br>origin : Lac Saint-Jean, Québec<br><br>mineral : sulphur<br>rock : brilliant yellow<br>powder : brilliant yellow<br>origin : unknown<br>production process:<br>(followed from «greyish brown [accentuated pink tone]»)<br>2 g of labrador + 2 g of sulphur / 1300 °F / 1 h (light greyish brown [light pink tone]) / irradia- |

| | | |
|---|---|---|
| | | ted with gamma[239] rays at 424.7 Mrad |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>0↑2000 °F (mixture of particles: white [yellow reflection] / brown) / powder irradiated with gamma rays at: |
| greyish brown much darker than «greyish brown»<br>↓ | 8237 | 64.7 Mrad |
| medium greyish brown | 8238 | 424.7 Mrad |
| | | mineral : pyrophillite<br>rock : light beige (grey and pink tones), opaque<br>powder : very light beige (grey and orange-pink tones)<br>origin : Carpentier district, Abitibi, Québec<br>production process:<br>(followed from «beige»)<br>rock irradiated with gamma rays at: |
| greyish brown darker than «greyish brown»<br>↓ | 8239 | 360 Mrad[1029] |
| medium greyish brown | 8240 | 487.864 Mrad |
| | | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br>production process: |
| medium greyish brown | 8241 | shale powder is deposited in a furnace/ the $COCO_2$ tube is connected to the furnace / 0↑1300 °F + 1 h at 1300 °F with gas / slow cooling in furnace with gas / sweeping with neutral gas (oxygen: 10.1%; balance: argon) before removal |
| | | mineral : serandite<br>rock : beige (light pinkish orange tone), opaque<br>powder : light pink<br>origin : De-Mix quarry, North side of Mont |

1572

| | | |
|---|---|---|
| medium greyish brown | 8242 | Saint-Hilaire, Rouville county, Québec<br><br>production process:<br>0↑900 °F (fairly dark yellowish beige) / rock is irradiated with electrons[46] at 305,200 rad |
| medium greyish brown | 8243 | mineral : cobalt sulphide[597]<br>rock : dark grey, with metallic brilliance<br>powder : dark grey<br>origin : Cobalt, Ontario<br><br>production process:<br>(followed from «brownish grey»)<br>4 g of cobalt sulphide + 20 ml hydrochloric acid / soaking: 24 h / separation of the liquid and the solid / drying on hot plate (colour of the solid: medium brownish grey[55,1080]) / irradiated with gamma rays at 424.7 Mrad |
| medium greyish brown | 8244 | mineral : sphalerite[31]<br>rock : honey-yellow<br>powder : pale honey-yellow<br>origin : Federal Mine, Lemieux district, Gaspésie, Québec<br><br>production process:<br>4 g of sphalerite + 20 ml hydrofluoric acid / soaking: 24 h / drying in drying oven at 100 °F |
| medium greyish brown | 8245 | mineral : obsidian<br>rock : very dark smoky grey, almost black<br>powder : light grey<br>origin : Arkansas, United States<br><br>production process:<br>2 g of obsidian + 20 ml sulphuric acid / soaking: 3 d. / drying on hot plate |
| medium greyish brown | 8246 | mineral : vesuvianite<br>rock : lilac<br>powder : lilac<br>origin : John Mansville Mine, Asbestos, Québec<br><br>production process:<br>(followed from «light brown»)<br>0↑1500 °F (fairly vivid light pink): 1 g + 40 ml sulphuric acid / soaking: 6 d. / drying on hot plate (very, very pale pink [almost white]) / irradiated with gamma rays at 425.65 Mrad |

| | | |
|---|---|---|
| greyish brown much more intense than «medium greyish brown» ↓ greyish brown a bit more grey and darker | 8247<br>8248 | mineral : corundum<br>rock : medium grey<br>powder : light grey<br>origin : Transvaal, Africa<br><br>production process:<br>0↑1900 °F (brownish grey): 1 g + 50 ml nitric acid / soaking: 2 wk. / drying on hot plate (medium greyish brown) / irradiated with gamma[239] rays at:<br>70.4 Mrad<br>430.4 Mrad |
| greyish brown a bit darker [grey] than «medium greyish brown» | 8249 | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>production process:<br>2 g of apatite + 2 g of sodium carbonate / 0↑1300 °F + 1 h at 1300 °F (medium brownish grey) / irradiated with gamma rays at 424.7 Mrad[81] |
| greyish brown a bit darker than «medium greyish brown» | 8250 | mineral : galena<br>rock : dark grey, with metallic brilliance<br>powder : dark grey, with metallic brilliance<br>origin : Trail, British Columbia<br><br>production process:<br>(followed from «greyish brown lighter than "medium greyish brown"»)<br>1300 °F / 1 h (medium grey) / powder irradiated with gamma rays at 482.984 Mrad |
| | | mineral : fluorescent calcite<br>rock : white (localized grey or brown reflection), translucid<br>powder : white (yellow reflection)<br>origin : Bancroft, Ontario |

| | | |
|---|---|---|
| greyish brown very lightly darker and grey than «medium greyish brown» | 8251 | <u>production process:</u><br>1 g of calcite + 1 cc of white transparent printing ink / mechanical grinding / 8 superimpositions on glazed white paper (medium greyish brown) / irradiated with gamma rays 5.7 Mrad[649] |
| greyish brown or brownish grey very lightly more grey and darker than «medium greyish brown» | 8252 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process:</u><br>1 g of fluorine + 1 cc of white transparent printing ink / mechanical grinding / 8 superimpositions (medium greyish brown or brownish grey) / irradiated with gamma rays at 5.7 Mrad[649] |
| greyish brown very lightly darker than «medium greyish brown» | 8253 | mineral : fluorine<br>rock : pinkish lilac, opaque<br>powder : very light lilac-grey, almost white<br>origin : Saint-Lawrence Fluorspar Company, Saint-Lawrence, Newfoundland<br><br><u>production process:</u><br>1 g of fluorine + 1 cc of white transparent printing ink / mechanical grinding / 8 superimpositions on white glazed paper (medium greyish brown) / irradiated with gamma rays at 11.4 Mrad[89,1030] |
| greyish brown lightly darker than «medium greyish brown» | 8254 | mineral : fluorine<br>rock : white (pink reflection), translucid<br>powder : white (grey reflection)<br>origin : Saint-Lawrence Fluorspar Company, Saint-Lawrence, Terre-Neuve<br><br><u>production process:</u><br>1 g of fluorine + 1 cc of white transparent printing ink / mechanical grinding / 8 superimpositions on white glazed paper (medium greyish brown) / irradiated with gamma rays at 5.7 Mrad[649] |
| | | mineral : spodumene<br>rock : pale green<br>powder : light grey, almost white<br>origin : Québec Lithium Co., Baraute, Abitibi, Québec |

| | | |
|---|---|---|
| greyish brown a bit darker than «medium greyish brown» | 8255 | production process:<br>(followed from «brownish grey much darker than "medium brownish grey"»)<br>2000 °F / 1 h (medium brownish grey) / powder irradiated with gamma rays at 484.704 Mrad |
| greyish brown much darker and brown than «medium greyish brown» | 8256 | mineral : anorthosite<br>rock : light grey<br>powder : very, very light greyish beige<br>origin : rang Sainte-Germaine, Oka, Québec<br><br>production process:<br>(followed from «brownish grey darker than "brownish grey"»)<br>powder irradiated with gamma rays at 424.7 Mrad |
| greyish brown or brownish grey [between «medium» and «dark» greyish brown or brownish grey] | 8257 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>(followed from «orange-brown a bit darker than "medium orange-brown"»)<br>2 g of ochre + 2 g of sodium carbonate / 0↑1500 °F + 45 min. at 1500 °F (medium orange brown) / irradiated with gamma rays at 423.88 Mrad |
| dark greyish brown | 8258 | mineral : solid epidote<br>rock : brownish green<br>powder : brownish green<br>origin : James Bay, Québec<br><br>production process:<br>0↑1700 °F (dark reddish brown): 1 g + 40 ml hydrochloric acid / soaking: 1 wk. / separation of the liquid and the solid / natural drying (colour of the liquid: vivid yellow) / irradiated with gamma rays at 425.65 Mrad |
| | | mineral : steatite<br>rock : light evergreen |

| | | |
|---|---|---|
| dark greyish brown | 8259 | powder : white<br>origin : East Broughton, Québec<br><br>mineral : nickel<br>powder : dark brownish grey, with metallic brilliance<br><br><u>production process:</u><br>1 g of steatite + 1 g of nickel / 2000 °F / 45 min. |
| dark greyish brown | 8259.1 | mineral : ochre[111]<br>powder : dark reddish brown<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>1 g of ochre + 1 g of sulphur + 6.50 g of glass powder (spruce pine batch) / manual grinding / deposited on a ceramic plate at the state of a biscuit / heating in a furnace 0↑1000 °C in ambient air / slow cooling in furnace |
| dark greyish brown [with localized green spots] | 8259.2 | mineral : chrome<br>powder : light grey, with metallic brilliance<br><br><u>production process:</u><br>1 g of chrome + 5 g of pyrex / manual grinding / heating: 5 °C per min. 0↑1245 °C + maintenance during 1 h / cooling: 5 °C per min. in ambient air / the entity is done in ambient air |
| dark greyish brown | 8260 | mineral : actinolite<br>rock : light and cold evergreen<br>powder : light grey (light green tone)<br>origin : erratic block found at Saint-Philémon near Dorchester, Québec<br><br><u>production process:</u><br>(followed from «orange-brown darker than "medium orange-brown"»)<br>3 g of actinolite + 50 ml hydrochloric acid / soaking: 2 wk. / separation of the liquid and the solid / drying on hot plate (colour of the liquid: rusty orange) / irradiated with gamma rays at 424.7 Mrad |

| | | |
|---|---|---|
| dark greyish brown | 8261 | mineral : agate<br>rock : grey (with a light orange circular area on the surface), slightly translucid<br>powder : very light grey<br>origin : unknown<br><br>mineral : sulphur<br>rock : brilliant yellow<br>powder : brilliant yellow<br>origin : unknown<br><br>production process:<br>1 g of agate + 1 g of sulphur / 1600 °F / 1 h |
| dark greyish brown | 8262 | mineral : chromite<br>rock : blackish grey<br>powder : medium brownish grey<br>origin : Black Lake, near Thetford Mines, Québec<br><br>production process:<br>4 g of chromite + 100 ml hydrochloric acid / soaking: 4 years / drying on hot plate[1031] |
| dark greyish brown | 8263 | mineral : solid epidote<br>rock : brownish green<br>powder : brownish green<br>origin : James Bay, Québec<br><br>production process:<br>(followed from «rusty brown»)<br>12 g of epidote + 40 ml hydrochloric acid / soaking: 14 d. / separation of the liquid and the solid / natural drying (colour of the solid: vivid yellow) / irradiated with gamma rays at 425.65 Mrad |
| dark greyish brown | 8264 | mineral : galena<br>rock : dark grey, with metallic brilliance<br>powder : dark grey, with metallic brilliance<br>origin : Trail, British Columbia<br><br>production process:<br>(followed from «greenish brown / brown / grey / beige»)<br>2 g of galena + 2 g of sodium carbonate / 1400 °F / 1 h (green / orange)[280] / irradiated with gamma rays at 424.7 Mrad |
| | | mineral : galena<br>rock : dark grey, with metallic brilliance<br>powder : dark grey, with metallic brilliance<br>origin : Trail, British Columbia |

1578

| | | |
|---|---|---|
| dark greyish brown | 8265 | mineral : steatite<br>rock : light cold grey, slightly translucid; stick measuring 1/2" x 4 7/8" x 1/8" and weighing 15 g<br>powder : light grey<br>origin : East Broughton, Québec<br><br>production process:<br>(followed from «orange-beige», «iron-grey darker than "dark iron-grey"», «mat brownish grey» and «brown»)<br>4 g of galena powder deposited on a steatite stick / 1400 °F / 1 h (glaze: «orange [with small green spots]» on the steatite, which is «golden beige» at its surface and «dark iron-grey» at its depth) / irradiated with gamma rays at 424.7 Mrad / colour of the steatite stick at its depth[1032]<br>(followed at «dark brownish grey») |
| dark greyish brown and mat | 8266 | mineral : biotite gneiss<br>rock : blackish grey, golden vitreous brilliance<br>powder : dark grey<br>origin : Grenville geological province, Québec<br><br>mineral : sulphur<br>rock : brilliant yellow<br>powder : brilliant yellow<br>origin : unknown<br><br>production process:<br>1 g of gneiss + 2 g of sodium carbonate + 1 g of sulphur / 1600 °F / 1 h |
| dark greyish brown<br>↓<br>darker greyish brown | 8267<br><br>8268 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>2 g of goethite + 2 g of potassium carbonate + 2 g of sulphur:<br>0↑1500 °F<br><br>0↑1600 °F<br>(followed at «dark iron-grey») |

| | | |
|---|---|---|
| dark greyish brown ↓ dark greyish brown | 8269<br>8270 | <u>production process:</u><br>(followed from «dark iron-grey» [2 g / 2 g / 2 g])<br>2 g of goethite + 4 g of potassium carbonate + 2 g of sulphur:<br>0↑1500 °F<br><br>0↑1600 °F<br>(followed at «dark iron-grey») |
| dark greyish brown ↓ darker greyish brown | 8271<br>8272 | <u>production process:</u><br>(followed from «dark iron-grey» [2 g / 4 g / 2 g])<br>2 g of goethite + 6 g of potassium carbonate + 2 g of sulphur:<br>0↑1500 °F<br><br>0↑1600 °F<br>(followed at «dark iron-grey») |
| dark greyish brown | 8273 | <u>production process:</u><br>(followed from «blackish green»)<br>1 g of goethite + 1 g of sodium carbonate + 2 g of sulphur / 1600 °F / 1 h<br>(followed at «soot black») |
| greyish brown darker than «dark greyish brown» | 8274 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u><br>(followed from «mat greyish brown [pink tone]» and «dark greyish chocolate-brown [accentuated violet-pink tone], mat»)<br>2 g of goethite + 2 g of sodium carbonate + 2 g of sulphur + 2 g of zirconium silicate + 2 g of titanium dioxide / 1600 °F / 1 h |
| | | mineral : goethite[106]<br>powder : rusty orange<br>origin : Red Mill, in the suburbs of Cap-de-la-Madeleine, Québec |

| | | |
|---|---|---|
| | | Madeleine, Québec<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u><br>(followed from «rusty brown»)<br>1 g of goethite + 1 g of titanium dioxide + 1 g of sodium carbonate + 1 g of zirconium silicate / 1900 °F / 1 h |
| dark greyish brown | 8275 | |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br><u>production process:</u><br>(followed from «medium brownish grey [violet-pink reflection]»)<br>0↑1400 °F / slow cooling in furnace (indian red[107]): 1.50 g + 1.50 g of feldspar (dark reddish brown): .50 g + .50 g of sodium carbonate + .50 g of sulphur / 1700 °F / 1 h |
| dark greyish brown | 8276 | |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>(followed from «dark grey»)<br>rock irradiated with gamma[45,571] rays at 604.53 Mrad |
| dark greyish brown | 8277 | |
| | | <u>production process:</u><br>(followed from «caramel-brown [grey reflection] darker than "caramel-brown [grey reflection]"») |

| | | |
|---|---|---|
| | | granules[1023] irradiated with gamma rays at: |
| dark brown (grey reflection) | 8278 | 360 Mrad[1033] |
| ↓ | | |
| dark brown (grey reflection) | 8279 | 424.7 Mrad |
| | | mineral : fuel oil soot[86]<br>powder : profound brownish black<br>origin : boiler room of Laval University, city of Québec, Québec<br><br><u>production process:</u> |
| dark greyish brown | 8279.1 | 1 g of soot + 6.50 g of glass powder (spruce pine batch) / manual grinding / deposited on a ceramic plate at the state of a biscuit / heating in a furnace 0↑1000 °C in ambient air / slow cooling in furnace |
| | | mineral : orthoclase<br>rock : light pinkish beige<br>powder : very light beige<br>origin : mine near Buckingham, Papineau county, Québec<br><br><u>production process:</u><br>2 g of orthoclase + 2 g of sodium carbonate / 0↑1500 °F + 1 h at 1500 °F (grey [light blue tone]) / irradiated with gamma[239] rays at: |
| dark greyish brown | 8280 | 63.81 Mrad |
| ↓ | | |
| greyish brown a bit darker | 8281 | 423.88 Mrad |
| | | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>1 g of ochre + 2 g of potassium carbonate + 1 g of sulphur: |
| dark greyish brown | 8282 | 0↑1500 °F |
| ↓ | | |
| darker and more grey greyish brown | 8283 | 0↑1600 °F |
| ↓ | | |
| still darker and | 8284 | 0↑1700 °F |

| | | |
|---|---|---|
| more grey greyish brown | | (followed at «dark iron-grey») |
| dark greyish brown | 8285 | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «dark brownish grey»)<br>1 g of ochre + 1 g of sulphur + 1 g of zirconium silicate / 0↑1000 °F<br>(followed at «greyish brown [light pink tone]») |
| dark greyish brown | 8286 | mineral : sardonyx<br>rock : white, slightly translucid (with a light orange-amber circular area on the surface)<br>powder : very light grey<br>origin : unknown<br><br>production process:<br>1 g of sardonyx + 1 g of sodium carbonate / 1600 °F / 1 h |
| dark greyish brown | 8287 | production process:<br>(followed from «brownish grey»)<br>rock irradiated with gamma rays at 424.7 Mrad[987,1034] |
| dark greyish brown | 8288 | mineral : serandite<br>rock : orange-pink or salmon (with more orange areas)<br>powder : pinkish white<br>origin : De-Mix quarry, North side of Mont Saint-Hilaire, Rouville county, Québec<br><br>production process:<br>2 g of serandite + 2 g of sodium carbonate:<br>0↑1200 °F + 1 h at 1200 °F |
| dark greyish brown | 8289 | 0↑1300 °F + 1 h at 1300 °F |

| | | |
|---|---|---|
| ↓ dark greyish brown | 8290 | 0↑1400 °F + 1 h at 1400 °F (followed at «blackish brown») |
| dark greyish brown | 8291 | mineral : spodumene<br>rock : pale green<br>powder : light grey, almost white<br>origin : Québec Lithium Co., Baraute, Abitibi, Québec<br><br>production process:<br>(followed from «mixture of particles: orange [green tone] / creamy yellow»)<br>0↑1900 °F (medium brownish grey): .20 g + 50 ml hydrochloric acid / soaking: 2 wk. / drying on hot plate (orange) / irradiated with gamma[239] rays at 424.7 Mrad |
| dark greyish brown | 8292 | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>production process:<br>1 g of tremolite + 2 g of sodium carbonate + 1 g of sulphur / 1600 °F / 1 h |
| dark greyish brown | 8293 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «light milky chocolate-brown»)<br>0↑1900 °F |
| dark greyish brown | 8294 | production process:<br>0↑1600 °F (light milky chocolate-brown): .20 g + 50 ml hydrochloric acid / soaking: 2 wk. / drying on hot plate (medium mossy chocolate-brown) / irradiated with gamma[228,538] rays:430.4 Mrad |

1584

| | | |
|---|---|---|
| dark greyish brown | 8295 | <u>production process:</u><br>(followed from «brown»)<br>0↑1600 °F (light milky chocolate-brown): .20 g + 50 ml nitric acid / soaking: 2 wk. / drying on hot plate (very dark brown, almost black) / irradiated with gamma rays at 430.4 Mrad[1035] |
| dark and intense greyish brown | 8296 | mineral : stibnite<br>rock : dark grey, with blue and silver metallic brilliance<br>powder : dark grey<br>origin : Consolidated Durham Mine, Saint-Georges, New Brunswick<br><br><u>production process:</u><br>(followed from «beige»)<br>1 g of stibnite + 100 ml hydrochloric acid / soaking: 2 wk. / drying on hot plate (green) / irradiated with gamma rays at 430.4 Mrad |
| greyish brown darker than «dark greyish brown» | 8297 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>mineral : titanium dioxide<br>powder : white<br>origin : NL Chem Canada Inc., Québec<br><br><u>production process:</u><br>(followed from «medium and mat orange-beige» and «dark greyish milky chocolate-brown [light orange tone]»)<br>2 g of goethite + 1 g of sodium carbonate + 1 g of sulphur + 1 g of zirconium silicate + 1 g of titanium dioxide / 1700 °F / 1 h |
| | | mineral : haematite<br>rock : medium chocolate-brown<br>powder : medium chocolate-brown<br>origin : Nouveau Québec, Québec<br><br>mineral : sulphur<br>rock : brilliant yellow |

1585

| | | |
|---|---|---|
| very dark greyish brown | 8298 | powder : brilliant yellow<br>origin : unknown<br><br>production process:<br>(followed from «brown darker than "medium brown"»)<br>2 g of haematite + 2 g of sulphur / 1500 °F / 1 h<br>(followed at «dark iron-grey») |
| very dark greyish brown | 8299 | mineral : pyrrhotite[276]<br>rock : dark greyish brown, with golden yellow metallic brilliance<br>powder : dark grey<br>origin : Inco Co., Sudbury, Ontario<br><br>production process:<br>(followed from «iron-grey a bit lighter than "very dark iron-grey [almost black]"»)<br>1000 °C / 1 h (dark iron-grey) / powder irradiated with gamma[45,571] rays at 424.7 Mrad |
| greyish brown lighter than «dark greyish brown [between "dark" and "blackish" greyish brown]» | 8300 | mineral : calcite<br>rock : light pink<br>powder : pinkish white<br>origin : Huddersfield district, Pontiac county, Québec<br><br>production process:<br>1600 °F / 1 h (greyish brown or brownish grey [between «dark and blackish greyish brown or brownish grey»]) / rock irradiated with gamma rays at 64.7 Mrad<br>(followed at «light orange-beige») |
| very dark greyish brown [almost black] | 8301 | mineral : halite[41]<br>rock : colourless<br>powder : colourless<br>origin : Seleine Mine, Iles-de-la-Madeleine, Québec<br><br>production process:<br>(followed from «pale greyish brown»)<br>rock hermetically wrapped in bread dough / 1500 °F / 1 h (white more opaque than «colourless») / irradiated with gamma rays at 424.7 Mrad |
| | | mineral : ochre[98]<br>powder : yellow<br>origin : small copper and nickel deposit, in the South-Western area of a mass of serpentinite at 3 km at the West of Saint-Fabien-de-Panet, Québec |

1586

| | | |
|---|---|---|
| very dark brown (light grey tone) [almost black] | 8302 | production process:<br>35 g of ochre + 100 ml phosphoric acid / soaking: 3 wk. / drying on hot plate (still humid) |
| greyish brown [almost black] | 8303 | mineral : haematite<br>rock : medium chocolate-brown<br>powder : medium chocolate-brown<br>origin : Nouveau Québec, Québec<br><br>production process:<br>4 g of haematite + 80 ml nitric acid / soaking: 2 wk. / drying on hot plate (dark violet-brown) / irradiated with electrons at 302,831 rad[36] |
| greyish brown or brownish grey [almost black] | 8304 | mineral : magnetite<br>rock : dark grey, with metallic brilliance<br>powder : dark grey<br>origin : Fosse du Labrador, Québec<br><br>production process:<br>(followed from «blackish grey»)<br>0↑1900 °F (dark chocolate-brown): 1 g + 50 ml nitric acid / soaking: 2 wk. / drying on hot plate (mixture of particles: medium brown-orange / blackish grey) / irradiated with gamma rays at 424.7 Mrad |
| blackish brown (light grey tone) | 8305 | mineral : ochre[20]<br>powder : orange<br>origin : small copper and nickel deposit, in the South-Western area of a mass of serpentinite at 3 km at the West of Saint-Fabien-de-Panet, Québec<br><br>production process:<br>45 g of ochre + 100 ml phosphoric acid / soaking: 3 wk. / drying on hot plate (still humid) |
| greyish brown (violet tone) | | |
| | | mineral : fluorine<br>rock : very pale yellow, translucid<br>powder : white (light yellow reflection)<br>origin : Ohio, United States |

1587

| | | |
|---|---|---|
| dark greyish brown (light violet tone) | 8306 | <u>production process</u>: (followed from «intense red-violet») 1 g of fluorine + 1 cc of synthetic white transparent enamel paint used for the car / manual grinding / application on a piece of steel sheet used for the car's body measuring 1" x 1" (greyish cream) / irradiated with gamma rays at 102.4 Mrad (followed at «bluish violet») |
| a bit darker greyish brown (light violet reflection) | 8307 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br><u>production process</u>: (followed from «dark caput-mortuum [pinkish violet tone]») 0↑1400 °F / slow cooling in furnace (indian red[107]): 8 g + 96 g of sulphur / 1500 °F/ 1 h (dark violet-brown): .50 g + .50 g of zirconium silicate / 1700 °F / 1 h |
| dark greyish brown (violet tone)<br>↓<br>darker greyish brown (violet tone) | 8308<br><br>8309 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br><u>production process</u>: (followed from «dark greyish brown [crimson tone]») 1 g of ochre + 3 g of halite:<br>0↑1600 °F<br><br>0↑1700 °F<br><br>(followed at «dark iron-grey [violet tone]») |

1588

| | | |
|---|---|---|
| greyish brown (pinkish violet tone) | | |
| greyish brown (pinkish violet tone) | 8310 | mineral : haematite<br>rock : medium chocolate-brown<br>powder : medium chocolate-brown<br>origin : Nouveau Québec, Québec<br><br>production process:<br>(followed from «violet-brown [red tone]»)<br>4 g of haematite + 80 ml nitric acid / soaking: 2 wk. / drying on hot plate (dark violet-brown) / irradiated with gamma rays at 424.7 Mrad |
| greyish brown (crimson tone) | | |
| greyish brown (crimson tone)<br>↓<br>darker greyish brown (crimson tone) | 8311<br><br>8312 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><br>production process:<br>(followed from «reddish brown»)<br>1 g of ochre + 2 g of halite:<br>0↑1500 °F<br><br>0↑1600 °F<br>(followed at «violet-brown [grey tone]») |
| dark greyish brown (crimson tone) | 8313 | production process:<br>(followed from «dark reddish brown [grey tone]»)<br>1 g of ochre + 3 g of halite / 0↑1500 °F<br>(followed at «dark greyish brown [violet tone]») |
| | | mineral : ochre[111]<br>powder : dark reddish brown<br>origin : Red Mill, in the suburbs of Cap-de-la-Madeleine, Québec<br><br>mineral : sulphur<br>rock : brilliant yellow<br>powder : brilliant yellow<br>origin : unknown |

| | | |
|---|---|---|
| | | production process: (followed from «brownish grey [light crimson tone]») 8 g of ochre + 8 g of sulphur + 8 g of potassium carbonate: |
| dark greyish brown (light crimson tone) ↓ | 8314 | 0↑1600 °F |
| darker greyish brown (light crimson tone) ↓ | 8315 | 0↑1700 °F |
| still darker greyish brown (light crimson tone) | 8316 | 0↑1750 °F |
| greyish brown (green tone) | | |
| greyish brown (light green reflection) darker than «very, very light greyish brown (green reflection)» | 8317 | mineral : calcite[11]<br>powder : white<br>origin : Calcite du Nord Company, Saint-Eugène de Mistassini, Lac Saint-Jean, Québec<br><br>production process: (followed from «white [beige or grey reflection]») 8 g of calcite + 50 cc of transparent polyester resin + 1% of catalyst / manual grinding / moulding / hardening (white [beige or grey reflection]) / irradiated with electrons at 305,082 rad[354] |
| greyish brown (light green tone) | 8318 | mineral : fuel oil soot[86]<br>powder : profound brownish black<br>origin : boiler room of Laval University, city of Québec, Québec<br><br>production process: 2 g of soot + 20 ml sulphuric acid / soaking: 24 h / deposited on hot plate / starts immediately to bubble[345] / immediately after the bubbling, separation of the liquid and the solid / drying on hot plate (colour of the liquid[77]: cold and mat grass-green [grey tone]): 3 g + 50 cc of transparent polyester resin + 1% of catalyst / manual grinding / moulding / hardening (light greyish green) / irradiated with electrons at 155,082 rad (followed at «khaki-green [grey tone]») |
| | | mineral : hornblende<br>rock : medium evergreen (light grey tone), |

| | | |
|---|---|---|
| | | with a vitreous brilliance<br>powder : medium cold grey (light green tone)<br>origin : Abitibi, Québec |
| greyish brown (green tone) darker than «greyish brown (green tone)» | 8319 | production process:<br>.3 g of hornblende + 50 cc of transparent polyester resin + 1% of catalyst / manual grinding / moulding / hardening (brownish grey [very, very light green tone]) / irradiated with electrons at 155,082 rad<br>(followed at «greyish brown [yellow reflection]») |
| greyish brown (light green reflection) or medium greyish brown (light green reflection) | 8320 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑1000 °F + 1 h at 1000 °F (light yellow [light green tone]) / irradiated with electrons at 302,831 rad[36] |
| dark greyish brown (green reflection) | 8321 | mineral : steatite<br>rock : light evergreen<br>powder : white<br>origin : East Broughton, Québec<br><br>mineral : chrome<br>powder : light grey, with metallic brilliance<br><br>production process:<br>1 g of steatite + 1 g of chrome / 2000 °F / 45 min. |
| dark greyish brown (green reflection) | 8322 | mineral : chrysocolla<br>rock : light greenish turquoise<br>powder : very light greenish turquoise<br>origin : Mexico<br><br>production process:<br>2 g of chrysocolla + 2 g of sodium carbonate / 900 °F / 1 h (dark lichen-green, almost black) / irradiated with gamma rays at 64.7 Mrad<br>(followed at «accentuated khaki-green [light greyish brown tone]») |
| | | mineral : cement[267]<br>powder : medium brownish grey<br>origin : CALCO, Charlesbourg, Québec |

1591

| | | |
|---|---|---|
| | | mineral : chrome<br>powder : light grey, with metallic brilliance<br><br>production process:<br>(followed from «cold and acute grass-green») |
| grass-green (brown tone) | 8323 | 1.50 g of cement + .50 g of chrome / 2000 °F / 2 h |
| which evolves towards | 8324 | 1.50 g of cement + .50 g of chrome / 2000 °F / 4 h |
| | 8325 | 1.50 g of cement + .50 g of chrome / 2000 °F / 6 h |
| dark greyish brown (green reflection) | 8326 | 1.50 g of cement + .50 g of chrome / 2000 °F / 8 h |
| ↓ | 8327 | 1.50 g of cement + .50 g of chrome / 2000 °F / 10 h |
| greyish brown (yellow tone) | | |
| greyish brown (yellow reflection) more intense and dark than «very light greyish brown (yellow tone)» | 8328 | mineral : halite[41]<br>rock : colourless<br>powder : colourless<br>origin : Seleine Mine, Iles-de-la-Madeleine, Québec<br><br>production process:<br>(followed from «very light brown»)<br>2 g of halite + 20 ml nitric acid / soaking: 3 d. / drying on hot (slightly milky white): .3 g + 50 cc of transparent polyester resin + 1% of catalyst / manual grinding / moulding / hardening (very light grey [light yellow reflection]) / irradiated with electrons at 305,082 rad[354] |
| greyish brown (yellow tone) darker than «light greyish brown (yellow tone)» | 8329 | mineral : crystalline quartz<br>rock : colourless<br>origin : Ferme Adam, Bonsecours, Eastern Townships, Québec<br>production process:<br>(followed from «light brownish grey [pink tone]»)<br>rock irradiated with gamma rays at 10 Mrad<br><br>(followed at «chocolate-brown [orange-yellow tone]») |
| | | mineral : hornblende<br>rock : medium evergreen (light grey tone), with a vitreous brilliance |

1592

| | | |
|---|---|---|
| greyish brown (accentuated yellow tone) more intense than «greyish brown (yellow reflection)» | 8330 | powder : medium cold grey (light green tone)<br>origin : Abitibi, Québec<br><br>production process:<br>(followed from «greyish brown [green tone]»)<br>.3 g of hornblende + 50 cc of transparent polyester resin + 1% of catalyst / manual grinding / moulding / hardening (brownish grey [very, very light green tone]) / irradiated with electrons at 305,082 rad[334] |
| greyish brown (orange tone) | | |
| pale brown (very light grey tone and orange reflection) | 8331 | mineral : zincite<br>rock : mixture of areas: dark grey / orange-red<br>powder : medium milky chocolate-brown (red tone)<br>origin : Franklin, New Jersey, United States<br><br>production process:<br>4 g of zincite + 80 ml nitric acid / soaking: 2 wk. / drying on hot plate (medium rusty orange [brown tone]) / irradiated with gamma rays at 64.7 Mrad<br>(followed at «dark chocolate-brown [orange reflection]») |
| greyish brown (light orange reflection) more pale than «medium greyish brown (orange tone)» | 8332 | mineral : hypersthene<br>rock : black<br>powder : medium brownish grey<br>origin : Lac Saint-Jean, Québec<br><br>production process:<br>(followed from «brownish grey darker and more grey than "medium brownish grey"»)<br>powder irradiated with gamma rays at 424.7 Mrad |
| medium greyish brown (orange tone) | 8333 | mineral : corundum<br>rock : medium grey<br>powder : light grey<br>origin : Transvaal, Africa<br><br>production process:<br>(followed from «brown darker than "light brown"»)<br>0↑1900 °F (brownish grey): 1 g + 50 ml hydrochloric acid / soaking: 2 wk. / drying on hot plate (light yellowish brown) / irradiated with gamma rays at 430.4 Mrad |

| | | |
|---|---|---|
| medium greyish brown (very light orange reflection) | 8334 | mineral : sericite shale<br>rock : light grey (green reflection)<br>powder : very, very light grey<br>origin : Magog, Québec<br><br>mineral : sulphur<br>rock : brilliant yellow<br>powder : brilliant yellow<br>origin : unknown<br><br>production process:<br>(followed from «greyish brown darker than "light brown"»)<br>2 g of shale + 2 g of sulphur / 1300 °F / 1 h (light grey [light brown tone]) / irradiated with gamma rays at 424.7 Mrad |
| greyish brown (light orange tone) much darker than «greyish brown (orange tone) darker than "medium greyish brown (orange tone)"» | 8335 | mineral : anorthosite<br>rock : dark grey<br>powder : medium grey<br>origin : Jonquière, Lac Saint-Jean, Québec<br><br>production process:<br>(followed from «brown [light pink and grey tones] much darker than "medium greyish brown [pink tone]"»)<br>0↑2000 °F (medium brown [light pink and grey tones]) / powder irradiated with gamma[239] rays at 424.7 Mrad |
| greyish brown (pinkish orange tone) | | |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : rusty orange<br>origin : Baraute, Abitibi, Québec<br><br>mineral : cement[1138]<br>powder : white<br><br>production process:<br>(followed from «pale chocolate-brown [light pink-orange tone]») |

| | | |
|---|---|---|
| medium greyish brown (light pinkish orange tone) | 8336 | 0↑1400 °F / slow cooling in furnace (indian red[107]): .25 g + .50 g of feldspar (dark brown [orange-red tone]): 1 g + 4.50 g of cement + 3 cc of water / manual grinding / moulding / hardening / 0↑1900 °F<br>(followed at «medium brownish beige [light pink tone]») |
| greyish brown (pink tone) | | |
| light greyish brown (light pink tone) | 8337 | mineral : labrador<br>rock : blackish grey<br>powder : medium grey<br>origin : Lac Saint-Jean, Québec<br><br>mineral : sulphur<br>rock : brilliant yellow<br>powder : brilliant yellow<br>origin : unknown<br><br>production process:<br>2 g of labrador + 2 g of sulphur / 1300 °F / 1 h |
| greyish brown (accentuated pink tone) much darker than «light greyish brown (pink tone)» | 8338 | production process:<br>2 g of labrador + 2 g of sulphur / 1300 °F / 1 h (light greyish brown [light pink tone]) / irradiated with gamma[239] rays at 64.7 Mrad<br><br>(followed at «medium greyish brown») |
| greyish brown (pink tone) a bit more pale than «greyish brown (pink tone)» | 8339 | mineral : actinolite<br>rock : light and cold evergreen<br>powder : light grey (light green tone)<br>origin : erratic block found at Saint-Philémon near Dorchester, Québec<br><br>production process:<br>(followed from «medium orange-brown»)<br>2 g of actinolite + 2 g of sodium carbonate / 0↑1900 °F + 1 h at 1900 °F (bluish green) / irradiated with gamma rays at 424.7 Mrad |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown |

1595

| | | |
|---|---|---|
| greyish brown (pink tone), mat | 8340 | mineral : zirconium silicate<br>powder : white (very light yellow reflection)<br>origin : Sial Company, Québec<br><br>production process:<br>2 g of goethite + 2 g of sodium carbonate + 2 g of sulphur + 2 g of zirconium silicate / 1500 °F / 1 h (followed at «dark greyish brown») |
| greyish brown (pink reflection)<br>↓ | 8341 | mineral : sylvite<br>rock : colourless<br>powder : colourless<br>origin : Strassfurt, Prussia, Germany<br><br>production process:<br>rock irradiated with gamma rays at:<br>5 Mrad[119] |
| more intense greyish brown (pink reflection) | 8342 | 10 Mrad[1036]<br>(followed at «chocolate-brown [orange reflection]») |
| medium brown (light grey and pink tones) | 8343 | mineral : anorthosite<br>rock : dark grey<br>powder : medium grey<br>origin : Jonquière, Lac Saint-Jean, Québec<br><br>production process:<br>0↑2000 °F |
| medium greyish brown (localized pink reflection) | 8344 | mineral : galena<br>rock : dark grey, with metallic brilliance<br>powder : dark grey, with metallic brilliance<br>origin : Trail, British Columbia<br><br>production process:<br>(followed from «beige darker than "light beige"») 20 g of galena + 100 ml nitric acid / soaking: 5 months / natural drying (light cream) / irradiated with gamma[239] rays at 424.7 Mrad |
| brown (light grey and pink tones) much darker than «medium greyish | 8345 | mineral : anorthosite<br>rock : dark grey<br>powder : medium grey<br>origin : Jonquière, Lac Saint-Jean, Québec<br><br>production process:<br>0↑2000 °F (medium brown [light pink and grey tones]) / irradiated with gamma[239] rays at 64.7 Mrad<br>(followed at «greyish brown [light orange tone] |

| | | |
|---|---|---|
| brown (pink tone)» | | much darker than "greyish brown [orange tone] much darker than medium greyish brown [orange tone]"») |
| | | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «dark greyish brown») |
| greyish brown (light pink tone) a bit darker than «dark greyish brown (pink tone)» | 8346 | 1 g of ochre + 1 g of sulphur + 1 g of zirconium silicate / 0↑1300 °F<br><br>(followed at «reddish brown») |
| greyish brown (pinkish deep purple tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «medium and mat orange-beige») |
| greyish brown (pinkish deep purple tone), mat | 8347 | 1 g of goethite + 2 g of sodium carbonate + 1 g of sulphur + 1 g of zirconium silicate / 1600 °F / 1 h<br>(followed at «dark and mat grey [light brown tone]») |
| | | mineral : goethite[106]<br>powder : rusty orange<br>origin : Red Mill, in the suburbs of Cap-de-la-Madeleine, Québec |

| | | |
|---|---|---|
| medium greyish brown (pinkish deep purple tone) | 8348 | mineral : zirconium silicate<br>powder : white (very light yellow reflection)<br>origin : Sial Company, Québec<br><br>production process:<br>(followed from «dark greyish brown [violet-pink tone]»)<br>1 g of goethite + 2 g of sodium carbonate + 1 g of zirconium silicate / 1600 °F / 1 h<br>(followed at «medium greyish brown [violet reflection]») |
| greyish brown (pinkish deep purple tone) | 8349 | mineral : goethite[106]<br>powder : rusty orange<br>origin : Red Mill, in the suburbs of Cap-de-la-Madeleine, Québec<br><br>mineral : feldspar<br>rock : white, opaque<br>powder : rusty orange<br>origin : Baraute, Abitibi, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «dark brown [violet-pink tone]»)<br>0↑1400 °F / slow cooling in furnace (indian red[107]): 1.50 g + 1 g of feldpsar (dark reddish brown): .50 g + .50 g of zirconium silicate + .50 g of sulphur / 1700 °F / 1 h |
| dark greyish brown (pinkish deep | 8350 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>1 g of goethite + 1 g of sodium carbonate + 1 g of sulphur + 1 g of zirconium silicate / 1600 °F / 1 h |

1598

| | | |
|---|---|---|
| purple tone) | | (followed at «dark milky greyish chocolate-brown [light orange tone]» and «medium and mat orange-beige») |
| dark greyish brown (pinkish deep purple tone) | 8351 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>2 g of goethite + 1 g of sodium carbonate + 1 g of zirconium silicate / 1600 °F / 1 h (followed at «medium greyish brown [violet-pink tone]») |
| greyish brown (orange-pink tone) | | |
| greyish brown (pink and orange reflections) [between «light» and «medium» greyish brown (orange-pink reflection)] | 8352 | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>(followed from «pinkish brown lighter than "pink-brown [between medium and dark pink-brown]"») 2 g of ilmenite + 2 g of sodium carbonate / 0↑1500 °F + 15 min. at 1500 °F (brown [reddish orange tone], between medium and dark brown [reddish orange tone]) / irradiated with gamma rays at 424.7 Mrad |
| greyish brown (violet-red tone) | | |
| | | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec |

1599

| | | |
|---|---|---|
| greyish brown (violet-red tone) | 8353 | production process:<br>(followed from «dark brown [violet-red tone]»)<br>1 g of ochre + 1 g of halite / 0↑1700 °F<br>(followed at «iron-grey [violet-brown tone]») |
| medium greyish brown (violet-red tone) | 8354 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br>production process:<br>(followed from «medium brownish grey [violet reflection]»)<br>2 g of goethite + 2 g of sodium carbonate + 2 g of zirconium silicate / 1600 °F / 1 h<br>(followed at «mossy olive-green») |
| greyish brown (amber tone) | | |
| dark greyish brown (localized amber reflection) | 8355 | mineral : microcline<br>rock : white (grey reflection)<br>powder : white (grey reflection)<br>origin : Buckingham, Québec<br><br>production process:<br>(followed from «very, very light pinkish beige»)<br>4 g of microcline + 50 ml sulphuric acid / soaking: 2 wk. / drying on hot plate (white) / irradiated with gamma rays at 424.7 Mrad |
| greyish brown (caramel tone) | | |
| accentuated greyish brown (localized caramel reflection) | 8356 | mineral : crystalline quartz<br>rock : colourless<br>origin : Ferme Adam, Bonsecours, Eastern Townships, Québec<br><br>production process:<br>rock irradiated with neutrons during 40,000 seconds at $10^{12}$ neutrons / $cm^2$ / second |

GREY (BEIGE TONE)

| colour obtained | number | mineral / production process |
|---|---|---|
| creamy grey | | |
| | | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «light cream [beige tone]»)<br>1 g of calcite + 1 cc of synthetic white transparent enamel paint used for the car / manual grinding / application on a piece of steel sheet used for the car's body measuring 1" x 1" (light yellowish cream) / irradiated with gamma rays at: |
| creamy grey | 8357 | 5 Mrad |
| ↓ | | |
| creamy grey | 8358 | 7.54 Mrad |
| ↓ | | |
| more intense creamy grey | 8359 | 10 Mrad<br>(followed at «light beige») |
| beige-grey | | |
| | | mineral : olivine<br>powder : colourless (green reflection)<br>origin : Mount Haven, United States<br><br>production process:<br>(followed from «light greenish grey [beige tone]») |
| beige-grey tint | 8360 | powder irradiated with gamma rays at 287.3 Mrad<br>(followed at «beige tint») |
| | | mineral : crystalline quartz<br>rock : colourless<br>origin : Ferme Adam, Bonsecours, Eastern Townships, Québec<br><br>production process:<br>rock irradiated with neutrons at $10^{12}$ neutrons / $cm^2$ / sec. during: |
| beige-grey tint | 8361 | 300 seconds[1049] |

| | | |
|---|---|---|
| ↓<br>more accentuated beige-grey tint | 8362 | 600 seconds[1050]<br>(followed at «brownish grey tint») |
| pale beige-grey of various tones<br>↓ | 8363 | mineral : coal<br>rock : black<br>powder : brownish black<br>origin : bank of Saint-Lawrence river, city of Québec, Québec<br><br>mineral : sulphur<br>rock : brilliant yellow<br>powder : brilliant yellow<br>origin : unknown<br><br>mineral : cement[1138]<br>powder : white<br><br>production process:<br>1 g of coal + 27.40 g of cement + 13 cc of water / manual grinding / moulding / hardening / 0↑1900 °F[1037] |
| | 8364 | 1 g of coal + 1 g of sulphur + 1 g of potassium carbonate + 27.40 g of cement + 13 cc of water / manual grinding / moulding / hardening / 0↑1900 °F |
| | 8365 | 1 g of coal + 1 g of potassium carbonate + 27.40 g of cement + 13 cc of water / manual grinding / moulding / hardening / 0↑1900 °F |
| ↓ | 8366 | 1 g of coal + 1 g of sulphur + 27.40 g of cement + 13 cc of water / manual grinding / moulding / hardening / 0↑1900 °F |
| very, very light beige-grey | 8367 | mineral : fluorine<br>rock : reddish violet, translucid<br>powder : very light grey<br>origin : Ohio, United States<br><br>mineral : sulphur<br>rock : brilliant yellow<br>powder : brilliant yellow<br>origin : unknown<br><br>production process:<br>1 g of fluorine + 1 g of sulphur / 1700 °F / 1 h |
| | | mineral : apatite<br>rock : dark grass-green (yellow tone), very slightly translucid |

1602

| | | |
|---|---|---|
| grey (light beige tone) more pale than «very light beige-grey» | 8368 | powder : powder filtered at 14 meshes: very, very light green; powder filtered beneath 14 meshes: light grey (beige tone and greenish reflection)<br>origin : Ile Calumet, Pontiac county, Québec<br><br>production process:<br>2 g of apatite + 2 g of sodium carbonate / 0↑1800 °F + 1 h at 1800 °F (very light beige) / irradiated with electrons at 302,831 rad[36] |
| very light beige-grey | 8368.1 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>.45 g of molybdenite + 5 g of pyrex / manual grinding / heating: 5 °C per min. 0↑1245 °C + maintenance during 1 h / cooling: 5 °C per min. until ambient temperature is reached / the entity is done in ambient air |
| very light grey (light beige tone) | 8369 | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 20 ml hydrofluoric acid / soaking: 24 h / drying in drying oven at 100 °F (light grey [beige tone]) / irradiated with electrons at 302,831 rad[36,1038] |
| very light beige-grey tone | 8370 | mineral : beryl<br>rock : light blue, lightly translucid<br>powder : light grey<br>origin : Abitibi, Québec<br><br>production process:<br>2 g of beryl + 2 g of sodium carbonate / 0↑1800 °F + 1 h (very light beige) / irradiated with electrons at 302,831 rad[36] |
| | | mineral : olivine<br>rock : light grey, crystalline<br>powder : very light grey<br>origin : Mont Albert, Gaspésie, Québec |

| | | |
|---|---|---|
| very light grey (light beige tone) | 8371 | production process:<br>powder irradiated with electrons at 302,831 rad[36] |
| very light beige-grey | 8372 | mineral : spodumene<br>rock : pale green<br>powder : light grey, almost white<br>origin : Québec Lithium Co., Baraute, Abitibi, Québec<br><br>production process:<br>2 g of spodumene + 80 ml nitric acid / soaking: 2 wk. / separation of the liquid and the solid / drying on hot plate (colour of the solid: white [beige reflection]) / irradiated with electrons at 302,831 rad[36] |
| very light beige-grey | 8373 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>0↑1900 °F (light beige-grey): .50 g + 50 ml hydrochloric acid / soaking: 2 wk. / drying on hot plate (light cream [light orange tone]) / irradiated with electrons at 302,831 rad[36] |
| very light beige-grey | 8374 | production process:<br>0↑2000 °F |
| beige-grey more pale than «light beige-grey» | 8375 | mineral : actinolite<br>rock : light and cold evergreen<br>powder : light grey (light green tone)<br>origin : erratic block found at Saint-Philémon near Dorchester, Québec<br><br>production process:<br>0↑1900 °F (light brown [very light orange tone]): 3 g + 80 ml sulphuric acid / soaking: 2 wk. / drying on hot plate (light cold grey) / irradiated with gamma rays at 70.4 Mrad<br>(followed at «medium greyish beige») |
| | | mineral : fluorine<br>rock : violet and white, translucid<br>powder : very light grey<br>origin : Saint-Lawrence Fluorspar Company, |

1604

| | | |
|---|---|---|
| beige-grey more pale than «light beige-grey» | 8376 | Saint-Lawrence, Newfoundland<br><br>mineral : sulphur<br>rock : brilliant yellow<br>powder : brilliant yellow<br>origin : unknown<br><br>production process:<br>2 g of fluorine + 2 g of sulphur / 1300 °F / 1 h (light greyish beige) / irradiated with electrons at 302,831 rad[36] |
| beige-grey more pale than «light beige-grey» | 8377 | mineral : steatite<br>rock : light evergreen<br>powder : white<br>origin : East Broughton, Québec<br><br>production process:<br>0↑1500 °F (light brownish grey) / irradiated with electrons at 302,831 rad[36] |
| grey (light beige tone) a bit more light than «light beige-grey» | 8378 | mineral : asbestos[4]<br>rock : dark grey (green reflection)<br>powder : light grey (green reflection)<br>origin : Asbestos Corporation Ltd., Thetford Mines, Québec<br><br>production process:<br>2 g of asbestos + 2 g of sodium carbonate (very light grey) / irradiated with gamma rays at:<br>190.22 Mrad |
| ↓<br>grey of same intensity (more accentuated beige tone) | 8379 | 550.22 Mrad |
| beige-grey lighter than «light beige-grey» | 8380 | mineral : corundum<br>rock : medium grey<br>powder : light grey<br>origin : Transvaal, Africa<br><br>production process:<br>1 g of corundum + 50 ml sulphuric acid / soaking: 2 wk. / drying on hot plate (light beige-grey) / irradiated with electrons at 302,831 rad[36] |

| | | |
|---|---|---|
| light beige-grey | 8381 | mineral : blue lace agate<br>rock : light violet-blue, lightly translucid<br>powder : very light grey<br>origin : Africa<br><br><u>production process:</u><br>3 g of agate + 40 ml hydrochloric acid / soaking: 1 wk. / separation of the liquid and the solid / natural drying (colour of the solid: white) / irradiated with electrons at 305,200 rad[46] |
| light beige-grey | 8382 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>3 g of asbestos + 20 ml hydrofluoric acid / soaking: 24 h / drying in drying oven at 100 °F |
| light grey (light beige tone) | 8383 | mineral : beryl<br>rock : light blue, lightly translucid<br>powder : light grey<br>origin : Abitibi, Québec<br><br><u>production process:</u><br>2 g of beryl + 2 g of sodium carbonate / 1700 °F + 1 h at 1700 °F (bluish turquoise more accentuated than «light bluish turquoise») / irradiated with gamma rays at 423.88 Mrad[262] |
| light beige-grey | 8384 | mineral : calcite<br>rock : light pink<br>powder : pinkish white<br>origin : Huddersfield district, Pontiac county, Québec<br><br>mineral : sulphur<br>rock : brilliant yellow<br>powder : brilliant yellow<br>origin : unknown<br><br><u>production process:</u><br>1 g of calcite + 1 g of sulphur / 1700 °F / 1 h |
| | | mineral : cement[1138]<br>powder : white<br><br>mineral : chrome |

| | | |
|---|---|---|
| light beige-grey | 8385 | powder : light grey, with metallic brilliance<br><br>production process:<br>27.40 g of cement + 1 g of chrome + 13 cc of water / manual grinding / moulding / hardening / 0↑1300 °F<br>(followed at «pale green») |
| light grey (light beige tone) | 8386 | mineral : corundum<br>rock : medium grey<br>powder : light grey<br>origin : Transvaal, Africa<br><br>production process:<br>0↑1900 °F (brownish grey): 1 g + 50 ml sulphuric acid / soaking: 2 wk. / drying on hot plate |
| light beige-grey | 8387 | production process:<br>1 g of corundum + 50 ml sulphuric acid / soaking: 2 wk. / drying on hot plate |
| | | mineral : diopside<br>rock : light grey<br>powder : light beige<br>origin : Mont Orford, Québec<br><br>production process:<br>powder irradiated with gamma rays at: |
| light grey (light beige tone) | 8388 | 5 Mrad[674] |
| ↓ | | |
| light grey (light beige tone) | 8389 | 10 Mrad |
| ↓ | | |
| light grey (light beige tone) | 8390 | 57.4 Mrad |
| ↓ | | |
| light grey (light beige tone) | 8391 | 63.984 Mrad<br>(followed at «beige-grey [green tone]») |
| light beige-grey | 8392 | mineral : fluorine<br>rock : reddish violet, translucid<br>powder : very light grey<br>origin : Ohio, United States<br><br>mineral : sulphur<br>rock : brilliant yellow<br>powder : brilliant yellow<br>origin : unknown<br><br>production process:<br>1 g of fluorine + 1 g of sulphur / 1700 °F / 1 h |

| | | |
|---|---|---|
| | | (very, very light beige-grey) / irradiated with electrons at 305,200 rad[46,1040] |
| light grey (light beige tone) | 8393 | mineral : kaolin<br>rock : chalk-white (yellow reflection)<br>powder : chalk-white (yellow reflection)<br>origin : Saint-Rémi d'Amherst, Québec<br><br>production process:<br>powder irradiated with electrons at 302,831 rad[36] |
| light grey (very light beige tone) | 8394 | mineral : microcline<br>rock : white (grey reflection)<br>powder : white (grey reflection)<br>origin : Buckingham, Québec<br><br>production process:<br>(followed from «white [grey reflection]»)<br>rock irradiated with electrons at 302,831 rad[45] |
| light beige-grey | 8395 | mineral : olivine<br>powder : colourless (green reflection)<br>origin : Mount Haven, United States<br><br>production process:<br>3 g of olivine + 20 ml hydrofluoric acid / soaking: 24 h / drying in drying oven at 100 °F (light cream [light orange tone]): .2 g + 50 cc of transparent polyester resin + 1% of catalyst / manual grinding / moulding / hardening (light grey [very light yellow reflection]) / irradiated with electrons at 155,082 rad<br>(followed at «yellowish grey») |
| | | mineral : glass powder<br>powder : light grey<br>origin : residues of the cutting of the glass, Vitreries Lepage, city of Québec, Québec<br><br>production process:<br>powder irradiated with gamma rays at: |
| light grey (beige tone) | 8396 | 5 Mrad |
| | 8397 | 5.7 Mrad |
| light grey (beige tone a bit more accentuated) | 8398 | 57.4 Mrad |
| light grey (beige tone still a bit | 8399 | 64.7 Mrad |

| | | |
|---|---|---|
| more accentuated) | | |
| ↓ | | |
| light grey (beige tone a bit more accentuated) | 8400 | 102.4 Mrad |
| ↓ | | |
| light grey (beige tone still a bit more accentuated) | 8401 | 148.4 Mrad |
| ↓ | | |
| light grey (beige tone a bit more accentuated) | 8402 | 201.6 Mrad |
| ↓ | | |
| light grey (beige tone still a bit more accentuated) | 8403 | 247.6 Mrad |
| ↓ | | |
| light grey (beige tone a bit more accentuated) | 8404 | 287.3 Mrad<br><br>(followed at «light chamois») |
| light beige-grey | 8405 | mineral : silica[91]<br>powder : very light grey, crystalline<br>origin : mine exploited by Développement Sex Inc. of Montréal for exploitation by SKW Bécancour. Lac La Galette, Charlevoix county, 30 miles at the North of Saint-Urbain, Québec<br><br><u>production process:</u><br>(followed from «pinkish beige [grey tone]»)<br>2 g of silica + 2 g of sodium carbonate / 0↑1500 °F + 15 min. at 1500 °F (very light cream, almost white) / irradiated with gamma rays at 424.7 Mrad |
| light beige-grey | 8406 | mineral : sodalite<br>rock : indigo-blue, slightly translucid<br>powder : light grey (light blue tone)<br>origin : possibly Africa<br><br><u>production process:</u><br>1500 °F / 1 h |
| | | mineral : steatite<br>rock : light cold grey, slightly translucid<br>powder : light grey |

1609

| | | |
|---|---|---|
| light beige-grey<br>↓<br>a bit darker beige-grey | 8407<br><br>8408 | origin : East Broughton, Québec<br><br>mineral : cement[1138]<br>powder : white<br><br>production process:<br>3 g of steatite + 27.40 g of cement + 13 cc of water / manual grinding / moulding / hardening:<br>0↑1600 °F<br><br>0↑1900 °F |
| light beige-grey | 8409 | mineral : steatite<br>rock : light evergreen<br>powder : white<br>origin : East Broughton, Québec<br><br>production process:<br>2 g of steatite + 20 ml hydrochloric acid / soaking: 3 d. / drying on hot plate (light cream): .3 g + 50 cc of transparent polyester resin + 1% of catalyst / manual grinding / moulding / hardening (very, very light greenish yellow) / irradiated with electrons at 155,082 rad (followed at «greenish yellow») |
| light beige-grey | 8410 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>0↑1900 °F |
| grey (light beige tone) a bit darker than «light beige-grey»<br>↓<br>darker grey (beige tone more accen- | 8411<br><br>8412 | mineral : andulusite<br>rock : light brownish grey<br>powder : light grey<br>origin : Bimbowrie, South Australia<br><br>production process:<br>powder irradiated with gamma[228] rays at:<br>5 Mrad<br><br>10 Mrad |

1610

| | | |
|---|---|---|
| tuated) | | |
| ↓ | | |
| grey still darker (beige tone still more accentuated) | 8413 | 57.4 Mrad |
| ↓ | | |
| darker grey (more accentuated beige tone) | 8414 | 102.4 Mrad |
| ↓ | | |
| still darker grey (more accentuated beige tone) | 8415 | 148.4 Mrad<br>(followed at «greyish brown darker than "greyish brown"») |
| beige-grey darker than «light beige-grey» | 8416 | mineral : Gaspé agate<br>rock : marbled nodule with shaded tints of white, pink and light grey, slightly translucid<br>powder : very light pinkish grey<br>origin : Mont Lyall, Gaspésie, Québec<br><br>production process:<br>(followed from «light greyish beige [light pink reflection]»)<br>rock irradiated with gamma rays at 57.4 Mrad[1041]<br>(followed at «brownish grey») |
| beige-grey darker than «light beige-grey» | 8417 | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>production process:<br>«light beige-grey (green tone)» powder irradiated with gamma rays at 244.53 Mrad[1042]<br>(followed at «medium greyish beige») |
| | | mineral : apatite<br>rock : light grass-green (light blue and yellow tones), very slightly translucid<br>powder : very light grey (light green tone)<br>origin : region of Buckingham, Québec<br><br>production process:<br>2 g of apatite + 2 g of sodium carbonate / |

1611

| | | |
|---|---|---|
| beige-grey darker than «light beige-grey», (beige tone a bit more accentuated) | 8418 | 0↑1900 °F + 1 h at 1900 °F (light beige-grey) / irradiated with gamma rays at: 64.7 Mrad |
| ↓ beige-grey much darker than «light beige-grey» | 8419 | 424.7 Mrad |
| beige-grey a bit darker and more grey than «light beige-grey» | 8420 | <u>production process:</u> 2 g of apatite + 2 g of sodium carbonate / 0↑1900 °F + 1 h at 1900 °F (light beige-grey) / irradiated with electrons at 302,831 rad[36] |
| beige-grey a bit darker than «light beige-grey» | 8421 | mineral : diopside<br>rock : light grey<br>powder : light beige<br>origin : Mont Orford, Québec<br><br><u>production process:</u><br>powder irradiated with electrons at 302,831 rad[36] |
| beige-grey a bit darker than «light beige-grey» | 8422 | mineral : microcline<br>rock : white (grey reflection)<br>powder : white (grey reflection)<br>origin : Buckingham, Québec<br><br><u>production process:</u><br>0↑2000 °F (light grey) / powder irradiated with electrons at 302,831 rad[36] |
| light beige-grey or greyish beige<br>\| | 8423 | mineral : milky quartz<br>rock : milky white, translucid<br>origin : Ferme Adam, Bonsecours, Eastern Townships, Québec<br><br><u>production process:</u><br>rock irradiated with gamma rays at:<br>5 Mrad[1043] |

1612

| | | |
|---|---|---|
| beige-grey or greyish beige slightly more accentuated<br>↓ | 8424 | 10 Mrad |
| beige-grey or greyish beige still more accentuated<br>↓ | 8425 | 57.4 Mrad |
| beige-grey or greyish beige darker than «light beige-grey» | 8426 | 64.7 Mrad[1044]<br>(followed at «accentuated brownish grey») |
| beige-grey much darker than «light beige-grey» | 8427 | mineral : spodumene<br>rock : pale green<br>powder : light grey, almost white<br>origin : Québec Lithium Co., Baraute, Abitibi, Québec<br><br>production process:<br>powder irradiated with gamma rays at 64.7 Mrad[1045]<br>(followed at «dark greyish beige») |
| grey (very light beige tone) a bit more pale than «beige-grey»<br>↓ | 8428 | mineral : asbestos[4]<br>rock : dark grey (green reflection)<br>powder : light grey (green reflection)<br>origin : Asbestos Corporation Ltd., Thetford Mines, Québec<br><br>production process:<br>powder irradiated with gamma rays at:<br>65.704 Mrad[1046] |
| beige-grey more pale (beige tone a bit more accentuated)<br>↓ | 8429 | 102.4 Mrad |
| beige-grey still more pale (beige tone still a bit more accentuated)<br>↓ | 8430 | 124.704 Mrad |

1613

| | | |
|---|---|---|
| beige-grey still a bit more pale (beige tone still a bit more accentuated)<br>↓ | 8431 | 148.4 Mrad |
| beige-grey still a bit more pale (beige tone still more accentuated)<br>↓ | 8432 | 201.6 Mrad |
| beige-grey (beige tone still more accentuated)<br>↓ | 8433 | 247.6 Mrad[1047] |
| beige-grey (beige tone still more accentuated)<br>↓ | 8434 | 287.3 Mrad |
| beige-grey (beige tone still more accentuated)<br>↓ | 8435 | 360 Mrad |
| beige-grey (beige tone still more accentuated) | 8436 | 484.704 Mrad |
| grey (light beige tone) | 8437 | production process:<br>0↑1000 °F<br>(followed at «chamois [light grey tone]») |
| beige-grey | 8438 | mineral : asbestos[4]<br>rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>.50 g of asbestos + .50 g of sodium carbonate + .50 g of sulphur / 1600 °F / 1 h<br>(followed at «dark reddish brown») |
| | | mineral : asbestos[4]<br>rock : dark grey (green reflection)<br>powder : light grey (green reflection)<br>origin : Asbestos Corporation Ltd., Thetford Mines, Québec |

1614

| | | |
|---|---|---|
| beige-grey | 8439 | mineral : zirconium silicate<br>powder : white (very light yellow reflection)<br>origin : Sial Company, Québec<br><br>production process:<br>.50 g of asbestos + .50 g of zirconium silicate / 1600 °F / 1 h<br>(followed at «chamois») |
| grey (light beige tone) | 8440 | mineral : apatite<br>rock : pale brownish green<br>powder : very light greyish green<br>origin : Black Lake, Thetford county, Québec<br><br>production process:<br>powder irradiated with electrons at 302,831 rad[36] |
| beige-grey | 8441 | mineral : apatite<br>rock : medium brownish red<br>powder : light pinkish beige<br>origin : Ile Calumet, Pontiac county, Québec<br><br>production process:<br>(followed from «grey»)<br>2 g of apatite + 2 g of sodium carbonate / 0↑1800 °F + 1 h at 1800 °F<br>(followed at «mixture of particles: light green / beige») |
| beige-grey | 8442 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>2 g of fluorine + 20 ml nitric acid / soaking: 3 d. / drying on hot plate (dark milky chocolate-brown): .2 g + 50 cc of transparent polyester resin + 1% of catalyst / manual grinding / moulding / hardening (very light grey [light yellow reflection]) / irradiated with electrons at 155,082 rad (followed at «grey [accentuated yellow reflection]») |
| | | mineral : halite[41]<br>rock : colourless<br>powder : colourless<br>origin : Seleine Mine, Iles-de-la-Madeleine, Québec |

| | | |
|---|---|---|
| beige-grey | 8443 | <u>production process:</u><br>2 g of halite + 20 ml hydrochloric acid / soaking: 3 d. / drying on hot plate (transparent white [light yellow reflection]): .3 g + 50 cc of transparent polyester resin + 1% of catalyst / manual grinding / moulding / hardening (very, very light grey [light yellow tone]) / irradiated with electrons at 155,082 rad<br>(followed at «dark yellow») |
| beige-grey | 8444 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br><u>production process:</u><br>4 g of pentlandite + 80 ml phosphoric acid / soaking: 2 wk. / drying on hot plate (still humid) / colour of the solid[9] |
| beige-grey | 8445 | mineral : quartz (with impurities of white kaolinite)<br>rock : opaline white, slightly translucid<br>origin : quarry near Saint-Rémi d'Amherst, Québec<br><br><u>production process:</u><br>(followed from «grey more accentuated than "light grey"»)<br>rock irradiated with gamma rays at 360 Mrad[1048]<br>(followed at «light brownish grey») |
| beige-grey<br>↓<br>more accentuated beige-grey | 8446<br><br>8447 | mineral : crystalline quartz<br>rock : colourless<br>origin : Ferme Adam, Bonsecours, Eastern Townships, Québec<br><br><u>production process:</u><br>rock irradiated with neutrons at $10^{12}$ neutrons / $cm^2$ / sec. during:<br>300 seconds[1049]<br><br>600 seconds[1050]<br>(followed at «brownish grey») |
| | | mineral : sericite shale<br>rock : light grey (green reflection)<br>powder : very, very light grey<br>origin : Magog, Québec |

| | | |
|---|---|---|
| beige-grey | 8448 | <u>production process:</u><br>(followed from «grey a bit darker than "light grey"»)<br>powder irradiated with gamma rays at 57.4 Mrad<br>(followed at «greyish beige») |
| beige-grey | 8449 | mineral : stibnite<br>rock : dark grey, with metallic brilliance<br>powder : dark grey, with metallic brilliance<br>origin : Hunan, China<br><br><u>production process:</u><br>5 g of stibnite + 20 ml sulphuric acid / soaking: 3 d. / drying on hot plate |
| beige-grey | 8450 | mineral : tremolite<br>rock : medium brown (evergreen tone)<br>powder : greyish beige<br>origin : Tetreault Mine, Montauban, Portneuf county, Québec<br><br><u>production process:</u><br>6 g of tremolite + 50 ml sulphuric acid / soaking: 2 wk. / drying on hot plate (white) / irradiated with electrons at 302,831 rad[36] |
| grey (light beige tone)<br>↓<br>beige-grey (more accentuated beige tone) | 8451<br><br>8452 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>(followed from «grey lighter than "light grey"»)<br>0↑ 900 °F<br><br>0↑1000 °F<br><br>(followed at «pinkish beige») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |

| | | |
|---|---|---|
| | | mineral : cement[1138]<br>powder : white<br><br>production process:<br>(followed from «very light grey»)<br>3 g of iron sulphide - nickel + 27.40 g of cement + 13 cc of water / manual grinding / moulding / hardening (very light grey): |
| beige-grey | 8453 | 0↑1200 °F |
| \| | 8454 | 0↑1300 °F |
| \| the beige | 8455 | 0↑1400 °F |
| \| tone | 8456 | 0↑1500 °F |
| \| becomes | 8457 | 0↑1600 °F |
| \| more | 8458 | 0↑1700 °F |
| ↓ | 8459 | 0↑1800 °F |
| accentuated | 8460 | 0↑1900 °F<br>(followed at «pale beige») |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : titanium dioxide<br>powder : white<br>origin : NL Chem Canada Inc., Québec<br><br>production process: |
| beige-grey | 8461 | 2 g of wilsonite + 2 g of sodium carbonate / / 1600 °F / 1 h (powerful azure-blue): .50 g + .50 g of titanium dioxide / 1700 °F / 1 h |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «pale french green») |
| beige-grey [be-tween «light» and «medium» beige-grey] | 8462 | 2 g of wilsonite + 2 g of sodium carbonate / 0↑1600 °F + 1 h at 1600 °F (azure-blue) / irradiated with gamma rays at 424.7 Mrad[239] |
| | | mineral : quartz<br>rock : light pink, translucid<br>powder : very light grey |

1618

| | | |
|---|---|---|
| beige-grey [between «light» and «medium» beige-grey] | 8463 | origin : unknown<br><br>production process:<br>(followed from «violet-grey»)<br>4 g of quartz + 40 ml sulphuric acid / soaking: 22 d. / drying on hot plate (white) / irradiated with gamma rays at 425.65 Mrad |
| medium beige-grey | 8464 | mineral : apatite<br>rock : medium brownish red<br>powder : light pinkish beige<br>origin : Ile Calumet, Pontiac county, Québec<br><br>production process:<br>(followed from «very light greyish beige»)<br>2 g of apatite + 2 g of sodium carbonate / 1900 °F / 1 h (mixture of particles: light green / beige) / irradiated with gamma rays at 424.7 Mrad |
| medium grey (light beige tone) | 8465 | mineral : calcite<br>rock : light pink<br>powder : pinkish white<br>origin : Huddersfield district, Pontiac county, Québec<br><br>production process:<br>1 g of calcite + 2 g of sodium carbonate / 1700 °F / 1 h |
| medium beige-grey | 8466 | mineral : uraninite<br>rock : medium chocolate-brown (red Bordeau tone)<br>powder : medium milky chocolate-brown<br>origin : Yellowknife, Canada<br><br>production process:<br>(followed from «beige-grey [light green tone] darker than "beige-grey [green tone]"»)<br>8 g of uraninite + 100 ml sulphuric acid / soaking: 2 wk. / drying on hot plate (grey [light green tone]) / irradiated with gamma rays at 423.88 Mrad |
| | | mineral : tremolite<br>rock : medium brown (evergreen tone)<br>powder : greyish beige<br>origin : Tetreault Mine, Montauban, Portneuf county, Québec<br><br>mineral : sulphur |

| | | |
|---|---|---|
| medium beige-grey | 8467 | rock : brilliant yellow<br>powder : brilliant yellow<br>origin : unknown<br><br>production process:<br>1 g of tremolite + 2 g of sodium carbonate + 1 g of sulphur / 1700 °F / 1 h |
| medium beige-grey | 8468 | production process:<br>1 g of tremolite + 1.50 g of sodium carbonate / 1600 °F / 8 h (very dark grass-green): .50 g + .50 g of sulphur / 1700 °F / 1 h |
| mixture of particles | | |
| light grey (light beige tone) / light grey / white<br>↓ | 8469 | mineral : asbestos[4]<br>rock : dark grey (green reflection)<br>powder : light grey (green reflection)<br>origin : Asbestos Corporation Ltd., Thetford Mines, Québec<br><br>production process:<br>.50 g of asbestos + .50 g of sodium carbonate (very light grey) / irradiated with gamma rays at: 254.204 Mrad[509] |
| light grey (light beige tone) / light grey / white | 8470 | 614.204 Mrad |
| beige-grey (green tone) | | |
| beige-grey (localized green reflection) much darker than «very light beige-grey (green reflection)» | 8471 | mineral : pyrophillite<br>rock : light beige (grey and pink tones), opaque<br>powder : very light beige (grey and orange-pink tones)<br>origin : Carpentier district, Abitibi, Québec<br><br>production process:<br>rock irradiated with electrons at 305,200 rad[46] |
| | | mineral : amazonite<br>rock : light greenish turquoise |

| | | |
|---|---|---|
| light beige-grey (light green reflection) | 8472 | powder : white (turquoise reflection)<br>origin : Lac Sairs, Témiscamingue, Québec<br><br>production process:<br>(followed from «light grey»)<br>1600 °F / 1 h (medium beige [orange-pink tone]) / rock irradiated with gamma rays at 424.7 Mrad |
| beige-grey (green tone) a bit more accentuated than «light beige-grey (green tone)»<br>↓ | 8473 | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>production process:<br>light beige-grey (green tone) powder irradiated with electrons at:<br>162,431 rad |
| beige-grey (green tone) still a bit more accentuated | 8474 | 302,831 rad[45] |
| beige-grey (green tone) a bit darker [brown] than «light beige-grey (green tone)» | 8475 | mineral : diopside<br>rock : light grey<br>powder : light beige<br>origin : Mont Orford, Québec<br><br>production process:<br>(followed from «light grey [light beige tone]»)<br>powder irradiated with gamma rays at:<br>64.7 Mrad |
| \| | 8476 | 102.4 Mrad |
| \| | 8477 | 122.984 Mrad |
| \| | 8478 | 148.4 Mrad |
| \| | 8479 | 201.6 Mrad |
| \| | 8480 | 247.6 Mrad |
| ↓ | 8481 | 287.3 Mrad |
| darkens | 8482 | 360 Mrad<br>(followed at «medium rusty orange») |

| | | |
|---|---|---|
| beige-grey (green tone) | 8483 | production process:<br>rock irradiated with gamma rays at 122.984 Mrad[509]<br>(followed at «pale caramel-brown») |
| beige-grey (light green tone) a bit darker than «beige-grey (green tone)» | 8484 | mineral : asbestos[4]<br>rock : dark grey (green reflection)<br>powder : light grey (green reflection)<br>origin : Asbestos Corporation Ltd., Thetford Mines, Québec<br><br>production process:<br>0↑1000 °F (grey [light beige tone]): 1 g + 1 cc of white transparent printing ink / mechanical grinding / 1 impression on white glazed paper (beige-grey [light green tone]) / irradiated with gamma rays at 22.8 Mrad[1051] |
| beige-grey (light green tone) darker than «beige-grey (green tone)» | 8485 | mineral : uraninite<br>rock : medium chocolate-brown (red Bordeau tone)<br>powder : medium milky chocolate-brown<br>origin : Yellowknife, Canada<br><br>production process:<br>8 g of uraninite + 100 ml sulphuric acid / soaking: 2 wk. / drying on hot plate (grey [light green tone]) / irradiated with gamma rays at 63.88 Mrad<br>(followed at «medium beige-grey») |
| beige-grey (green tone), [between «light» and «medium» beige-grey] | 8486 | mineral : cobalt sulphide[597]<br>rock : dark grey, with metallic brilliance<br>powder : dark grey<br>origin : Cobalt, Ontario<br><br>production process:<br>(followed from «old rose much more accentuated than "pale old rose"»)<br>4 g of cobalt sulphide + 20 ml nitric acid / soaking: 24 h / separation of the liquid and the solid / drying on hot plate (colour of the solid[598]: pale old rose [light orange tone]) / irradiated with gamma rays at 424.7 Mrad[239] |
| beige-grey (yellow tone) | | |
| | | mineral : fluorescent calcite<br>rock : white (localized grey or brown reflection), translucid<br>powder : white (yellow reflection)<br>origin : Bancroft, Ontario |

| | | |
|---|---|---|
| beige-grey (light yellow reflection) darker than «light beige-grey (light yellow reflection)» | 8487 | production process:<br>4 g of calcite + 20 ml nitric acid / soaking: 3 d. / separation of the liquid and the solid / drying on hot plate (colour of the solid: dark brownish grey): .3 g + 50 cc of transparent polyester resin + 1% of catalyst / manual grinding / moulding / hardening (light beige-grey [light yellow reflection]) / irradiated with electrons at 155,082 rad (followed at «greyish beige [acute greenish yellow reflection]») |
| pearly beige-grey (orange tone) | | |
| medium and accentuated pearly grey (light orange-beige tone) | 8488 | mineral : apophyllite<br>rock : milky white, translucid<br>powder : white<br>origin : Gaspé Copper Mine, Gaspé, Québec<br><br>production process:<br>(followed from «grey much darker than "light grey"»)<br>0↑2000 °F (light grey) / powder irradiated with gamma rays at 424.7 Mrad |
| beige-grey (pink tone) | | |
| beige-grey (very light pink reflection) | 8489 | mineral : beryl<br>rock : light blue (near turquoise), slightly translucid<br>powder : light grey<br>origin : Lacorne district, Abitibi, Québec<br><br>mineral : sulphur<br>rock : brilliant yellow<br>powder : brilliant yellow<br>origin : unknown<br><br>production process:<br>1 g of beryl + 1 g of sulphur / 1600 °F / 1 h |
| | | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec |

| | | |
|---|---|---|
| light beige-grey (light pink tone) | 8490 | <u>production process:</u><br>(followed from «light grey»)<br>1 g of ochre + 1 g of titanium dioxide /<br>0↑1000 °F<br>(followed at «pinkish beige [light grey tone]») |
| light beige-grey (light pink tone) | 8491 | <u>production process:</u><br>(followed from «light grey»)<br>1 g of ochre + 2 g of titanium dioxide /<br>0↑1000 °F<br>(followed at «light pinkish beige [light grey tone]») |
| light beige-grey (pinkish beige tone) | 8492 | mineral : ochre[128]<br>powder : black<br>origin : Red Mill, in the suburbs of Cap-de-la -Madeleine, Québec<br><br>mineral : zirconium silicate<br>powder : white (very light yellow reflection)<br>origin : Sial Company, Québec<br><br><u>production process:</u><br>(followed from «light grey»)<br>1 g of ochre + 1 g of zirconium silicate + 1 g of titanium dioxide / 0↑1000 °F<br>(followed at «light pinkish beige [grey tone]») |
| | | mineral : silica[91]<br>powder : very light grey, crystalline<br>origin : mine exploited by Développement Bex Inc. of Montréal for exploitation by SKW Bécancour. Lac La Galette, Charlevoix county, 30 miles at the North of Saint-Urbain, Québec<br><br><u>production process:</u> |
| light grey (light pink-beige tone) | 8493 | 0↑1600 °F |
| light grey (a bit more accentuated pink-beige tone) | 8494 | 0↑1700 °F |
| light grey (still a bit more accentuated pink-beige tone) | 8495 | 0↑1800 °F |
| light grey (still a bit more accentuated pink-beige tone) | 8496 | 0↑1900 °F |

1624

| | | |
|---|---|---|
| ↑ | | |
| light grey (a bit more accentuated pink-beige tone) | 8497 | 0↑2000 °F (followed from «light grey [very light pink tone]») |
| ↑ | | |
| light grey (still a bit more accentuated pink-beige tone) | 8498 | 0↑2100 °F |
| ↓ | | |
| light grey (a bit more accentuated pink-beige tone) | 8499 | 0↑2300 °F |

GREY (BROWN TONE)

| colour obtained | number | mineral / production process |
|---|---|---|
| light brown-grey tint | 8500 | mineral : quartz (with impurities of white kaolinite)<br>rock : opaline white, slightly translucid<br>origin : quarry near Saint-Rémi d'Amherst, Québec<br><br>production process:<br>rock irradiated with electrons at 305,200 rad[46] |
| | | mineral : crystalline quartz<br>rock : colourless<br>origin : Ferme Adam, Bonsecours, Eastern Townships, Québec<br><br>production process:<br>(followed from «beige-grey tint»)<br>rock irradiated with neutrons at $10^{12}$ neutrons / $cm^2$ / sec. during: |
| brown-grey tint | 8501 | 1,000 seconds |
| ↓ | | |
| brown-grey tint a bit more intense | 8502 | 1,500 seconds |
| ↓ | | |
| brown-grey tint a bit more intense | 8503 | 2,000 seconds |
| ↓ | | |
| brown-grey tint still a bit more intense | 8504 | 3,000 seconds |
| ↓ | | |
| brown-grey tint still a bit more intense | 8505 | 6,000 seconds |
| ↓ | | |
| brown-grey tint a bit more intense | 8506 | 10,000 seconds<br>(followed at «light brown») |
| | | mineral : sardonyx<br>rock : white, slightly translucid (with a |

| | | |
|---|---|---|
| | | light orange-amber circular area on the surface)<br>powder : very light grey<br>origin : unknown<br><br>production process:<br>(followed at «grey [blue reflection] much darker than "very, very light grey [blue reflection]"»)<br>rock[1052,1053] irradiated with gamma[67,73] at: |
| brown-grey darker than «brown-grey tint»<br>↓ | 8507 | 148.7 Mrad |
| brown-grey still a bit darker and more brown<br>↓ | 8508 | 201.6 Mrad |
| brown-grey still darker and more brown ↓ | 8509 | 247.6 Mrad |
| brown-grey still darker and more brown ↓ | 8510 | 287.3 Mrad |
| brown-grey still darker and more brown | 8511 | 360 Mrad<br><br>(followed at «dark greyish brown») |
| pale brown-grey | 8512 | mineral : magnetite<br>rock : dark grey, with metallic brilliance<br>powder : dark grey<br>origin : Fosse du Labrador, Québec<br><br>production process:<br>(followed from «orange-brown more pale and mat than "dark orange-brown"»)<br>2 g of magnetite + 2 g of sodium carbonate / 0↑1500 °F + 1 h at 1500 °F (dark orange-brown) / irradiated with gamma rays at 423.88 Mrad[239] |
| very, very light brown-grey | 8513 | mineral : bauxite[92]<br>powder : pinkish beige, mat<br>origin : Alcan Company, French Guyana<br><br>production process:<br>3 g of bauxite + 20 ml hydrofluoric acid / soaking: 24 h / drying in drying oven at 100 °F (light brownish grey) / irradiated with electrons at 302,831 rad[36] |

1627

| | | |
|---|---|---|
| very light brown-grey [with a few green particles] | 8514 | mineral : agate<br>rock : grey (with a light orange circular area on the surface), slightly translucid<br>powder : very light grey<br>origin : unknown<br><br>production process:<br>3 g of agate + 40 ml sulphuric acid / soaking: 14 d. / drying on hot plate[1054] |
| very light brown-grey | 8515 | mineral : apatite<br>rock : light grass-green (light blue and yellow tones), very slightly translucid<br>powder : very light grey (light green tone)<br>origin : region of Buckingham, Québec<br><br>production process:<br>3 g of apatite + 20 ml sulphuric acid / soaking: 3 d. / drying on hot plate[24] |
| very light brown-grey | 8516 | mineral : fluorine<br>rock : very light fluor-green (cold mint-green type), translucid<br>powder : very light grey<br>origin : Rogers Mine, Madoc, Ontario<br><br>mineral : sulphur<br>rock : brilliant yellow<br>powder : brilliant yellow<br>origin : unknown<br><br>production process:<br>1 g of fluorine + 1 g of sulphur / 1700 °F / 1 h |
| very light brown-grey | 8517 | mineral : microcline<br>rock : white (grey reflection)<br>powder : white (grey reflection)<br>origin : Buckingham, Québec<br><br>production process:<br>(followed from «white [grey reflection]»)<br>rock irradiated with gamma rays at 244.53 Mrad<br>(followed at «light greyish beige») |
| | | mineral : molybdenite[103]<br>rock : medium grey, with metallic brilliance<br>powder : medium grey, with metallic brilliance<br>origin : Anglo American Molybdenite Mine, near |

| | | |
|---|---|---|
| | | Lamotte, Preissiac district, Abitibi, Québec<br><br><u>production process:</u><br>(followed from «light metallic grey» and «Naples yellow [green tone]»)<br>powder finely grinded and heated at: |
| very light brown-grey, with metallic brilliance<br>↓ | 8518 | 1400 °F / 1 h[1055] |
| darker brown-grey with metallic brilliance | 8519 | 1500 °F / 1 h[1055] |
| | | mineral : apatite<br>rock : medium brownish red<br>powder : light pinkish beige<br>origin : Ile Calumet, Pontiac county, Québec<br><br><u>production process:</u><br>(followed from «beige») |
| brown-grey more intense than «very light brown-grey» | 8520 | 3 g of apatite + 25 ml hydrochloric acid / soaking: 3 d. / drying on hot plate (mixture of parcles: white / brown): .2 g + 50 cc of transparent polyester resin + 1% of catalyst / manual grinding / moulding / hardening (very light brownish grey) / irradiated with electrons at 305,082 rad[354] |
| | | mineral : blue lace agate<br>rock : light violet-blue, slightly translucid<br>powder : very light grey<br>origin : Africa<br><br><u>production process:</u><br>(followed from «light grey [green reflection]»)<br>rock irradiated with gamma rays at: |
| brown-grey darker than «very light brown-grey»<br>\| | 8521 | 102.4 Mrad[1056] |
| brown-grey almost equivalent to the previous one<br>\| | 8522 | 148.4 Mrad |
| darker brown-grey<br>\| | 8523 | 201.6 Mrad |
| still darker brown-grey | 8524 | 247.6 Mrad |

1629

| | | |
|---|---|---|
| ↑<br>still darker brown-grey<br>↑ | 8525 | 287.3 Mrad |
| darker brown-grey<br>↓ | 8526 | 360 Mrad |
| darker brown-grey | 8527 | 424.7 Mrad |
| brown-grey a bit darker [brown] than «very light brown-grey» | 8528 | mineral : asbestos*<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Québec<br><br><u>production process:</u><br>.50 g of asbestos + .50 g of zirconium silicate (very light grey) / irradiated with electrons at 162,431 rad |
| brown-grey darker than «very light brown-grey» | 8529 | mineral : analcime<br>rock : white (grey reflection), crystalline and translucid<br>powder : light grey<br>origin : De-Mix quarry, North side of Mont Saint-Hilaire, Rouville county, Québec<br><br><u>production process:</u><br>(followed from «medium olive-green» and «light olive-green»)<br>0↑2000 °F (very light grey [cristalline and translucid]) / powder irradiated with gamma rays at 64.7 Mrad<br>(followed at «medium brownish grey») |
| | | mineral : fluorine<br>rock : very light fluor-green (cold mint-green type), translucid<br>powder : very light grey<br>origin : Rogers Mine, Madoc, Ontario<br><br>mineral : sulphur<br>rock : brilliant yellow<br>powder : brilliant yellow<br>origin : unknown |

| | | |
|---|---|---|
| brown-grey more intense and luminous, more grey and less brown than «very light brown-grey» | 8530 | production process:<br>1 g of fluorine + 1 g of sulphur / 1700 °F / 1 h (very light brownish grey) / irradiated with electrons at 305,200 rad[46] |
| brown-grey more pale and less brown than «light brown-grey» | 8531 | mineral : dolomite<br>rock : light grey<br>powder : light grey<br>origin : Shefferville, Ungava, Québec<br><br>production process:<br>powder irradiated with electrons at 302,831 rad[36] |
| grey (light brown tone) more pale than «light brown -grey» | 8532 | mineral : obsidian<br>rock : very dark smoky grey, almost black<br>powder : light grey<br>origin : Arkansas, United States<br><br>production process:<br>2 g of obsidian + 2 g of sodium carbonate / 0↑1300 °F + 1 h at 1300 °F (light greyish brown) / irradiated with electrons at 302,831 rad[36] |
| brown-grey or greyish brown a bit more pale than «light brown -grey» | 8533 | mineral : steatite<br>rock : light evergreen<br>powder : white<br>origin : East Broughton, Québec<br><br>production process:<br>2000 °F / 1 h (light orange-brown) / powder irradiated with electrons at 302,831 rad[36,1057] |
| grey (light brown tone) a bit lighter than «light brown-grey» | 8534 | mineral : cerite<br>rock : dark brownish grey<br>powder : light grey (light brown tone)<br>origin : Jamestown, Boulder county, Colorado, United States<br><br>production process:<br>powder irradiated with electrons at 302,831 rad[36,1058] |

| | | |
|---|---|---|
| light grey (light brown tone) | 8535 | mineral : anorthosite<br>rock : dark grey<br>powder : medium grey<br>origin : Jonquière, Lac Saint-Jean, Québec<br><br>production process:<br>6 g of anorthosite + 50 ml sulphuric acid / soaking: 2 wk. / drying on hot plate (light grey) / irradiated with electrons at 162,431 rad |
| light brown-grey | 8536 | mineral : bauxite[92]<br>powder : pinkish beige, mat<br>origin : Alcan Company, French Guyana<br><br>production process:<br>3 g of bauxite + 20 ml hydrofluoric acid / soaking: 24 h / drying in drying oven at 100 °F |
| light grey (light brown tone) | 8537 | mineral : halite[41]<br>rock : colourless<br>powder : colourless<br>origin : Seleine Mine, Iles-de-la-Madeleine, Québec<br><br>production process:<br>rock irradiated with electrons at 319,882 rad (light lemon-yellow), then with gamma rays at 5 Mrad[1059] |
| light brown-grey | 8538 | production process:<br>rock irradiated with electrons at 162,431 rad (light grey [light blue tone]), then with X rays[1060] |
| light grey (light brown tone) | 8539 | production process:<br>rock irradiated with electrons at 164,800 rad (light grey [light blue tone]), then at 155,082 rad (light lemon-yellow), then with gamma rays at 5 Mrad<br>(followed at «medium brownish grey») |
| light brown-grey | 8540 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>10 g of ochre + 100 ml sulphuric acid / soaking: 1 wk. / drying on hot plate |

1632

| | | |
|---|---|---|
| light brown-grey | 8541 | mineral : quartz (with impurities of white kaolinite)<br>rock : opaline white, slightly translucid<br>origin : quarry near Saint-Rémi d'Amherst, Québec<br><br>production process:<br>(followed from «beige-grey»)<br>rock irradiated with gamma rays at 424.7 Mrad[1061] |
| light grey (light brown tone) | 8542 | mineral : sericite shale<br>rock : light grey (green reflection)<br>powder : very, very light grey<br>origin : Magog, Québec<br><br>mineral : sulphur<br>rock : brilliant yellow<br>powder : brilliant yellow<br>origin : unknown<br><br>production process:<br>2 g of shale + 2 g of sulphur / 1300 °F / 1 h |
| light brown-grey | 8543 | mineral : antigorite<br>rock : pale yellowish green<br>powder : very pale greenish yellow<br>origin : Canadian Refractories Mine, Kilmar, Québec<br><br>production process:<br>2 g of antigorite + 20 ml phosphoric acid / soaking: 3 d. / drying on hot plate (still humid) / colour of the solid[37] |
| light grey (light brown tone) | 8544 | mineral : serpentine<br>rock : yellowish green<br>powder : light greenish yellow<br>origin : probably Thetford Mines, Eastern Townships, Québec<br><br>production process:<br>3 g of serpentine + 25 ml sulphuric acid / soaking: 24 h / drying on hot plate |
| | | mineral : steatite<br>rock : light evergreen<br>powder : white<br>origin : East Broughton, Québec |

| | | |
|---|---|---|
| | | <u>production process:</u> |
| | | (followed from «light green [light yellow tone]») |
| light grey (light brown tone) | 8545 | 0↑1200 °F |
| ↓ | | |
| light grey (more accentuated brown tone) | 8546 | 0↑1300 °F |
| ↓ | | |
| light grey (more accentuated brown tone) | 8547 | 0↑1400 °F |
| ↓ | | |
| light grey (still more accentuated brown tone) | 8548 | 0↑1500 °F |
| | | (followed at «light brownish orange») |
| | | mineral : zinc |
| | | powder : medium grey, with metallic brilliance |
| | | <u>production process:</u> |
| light brown-grey | 8549 | 70 g of zinc + 100 ml sulphuric acid / soaking: 5 months / natural drying, completed on hot plate / colour of the solid[455] |
| | | mineral : cerite |
| | | rock : dark brownish grey |
| | | powder : light grey (light brown tone) |
| | | origin : Jamestown, Boulder county, Colorado, United States |
| | | <u>production process:</u> |
| | | powder irradiated with gamma rays at: |
| light grey (light brown tone) | 8550 | 5 Mrad |
| ↓ | 8551 | 10 Mrad |
| darkens and | 8552 | 57.4 Mrad |
| ↓ | 8553 | 65.704 Mrad |
| ↓ | 8554 | 102.4 Mrad |
| ↓ | 8555 | 148.4 Mrad |
| ↓ | 8556 | 201.6 Mrad |
| ↓ | 8557 | 244.53 Mrad |
| ↓ | 8558 | 247.6 Mrad |
| becomes more brown | 8559 | 287.3 Mrad |
| | | (followed at «medium brown [yellow tone]») |
| | | mineral : spodumene |
| | | rock : pale green |
| | | powder : light grey, almost white |
| | | origin : Québec Lithium Co., Baraute, Abitibi, Québec |

| | | |
|---|---|---|
| brown-grey a bit darker than «light brown-grey» | 8560 | mineral : sulphur<br>rock : brilliant yellow<br>powder : brilliant yellow<br>origin : unknown<br><br><u>production process:</u><br>2 g of spodumene + 2 g of sulphur / 1300 °F / 1 h (light greyish beige) / irradiated with electrons at 302,831 rad[36] |
| grey (light brown tone) a bit darker than «light brown-grey»<br>↓ | 8561 | mineral : dolomite<br>rock : light grey<br>powder : light grey<br>origin : Shefferville, Ungava, Québec<br><br><u>production process:</u><br>(followed from «grey lighter than "light grey"»)<br>rock irradiated with gamma rays at:<br>102.4 Mrad |
| grey a bit darker (brown tone a bit more accentuated) | 8562 | 122.984 Mrad<br><br>(followed at «light greyish beige») |
| brown-grey a bit darker than «light brown-grey»<br>↓ | 8563 | <u>production process:</u><br>powder irradiated with gamma rays at:<br>65.704 Mrad |
| brown-grey much darker and cold (less brown) | 8564 | 244.53 Mrad<br><br>(followed at «dark greyish beige») |
| brown-grey a bit darker than «light brown-grey»<br>\| | 8565 | mineral : labrador<br>rock : blackish grey<br>powder : medium grey<br>origin : Lac Saint-Jean, Québec<br><br><u>production process:</u><br>rock irradiated with gamma[228] rays at:<br>57.4 Mrad[1062] |
| brown-grey still a bit darker<br>\| | 8566 | 63.984 Mrad |

| | | |
|---|---|---|
| brown-grey still a bit darker (brown tone more accentuated) | 8567 | 102.4 Mrad |
| ↓ | | |
| brown-grey still a bit darker (brown tone more accentuated) | 8568 | 148.4 Mrad |
| ↓ | | |
| which darkens | 8569 | 201.6 Mrad |
| ↓ and | 8570 | 242.804 Mrad |
| ↓ becomes | 8571 | 247.6 Mrad |
| ↓ | 8572 | 287.3 Mrad |
| considerably | 8573 | 360 Mrad[1063] |
| ↓ | | |
| more brown | 8574 | 602.804 Mrad |
| | | mineral : amazon stone<br>rock : light greenish turquoise, translucid<br>powder : white (turquoise reflection)<br>origin : unknown |
| brown-grey darker than «light brown-grey» | 8575 | <u>production process:</u><br>rock hermetically wrapped in bread dough / 1600 °F / 1 h (light iron-grey) / irradiated with gamma[228] rays at 424.7 Mrad |
| | | mineral : sericite shale<br>rock : light grey (green reflection)<br>powder : very, very light grey<br>origin : Magog, Québec<br><br>mineral : sulphur<br>rock : brilliant yellow<br>powder : brilliant yellow<br>origin : unknown |
| brown-grey darker than «light brown-grey» [the grey is more accentuated] | 8576 | <u>production process:</u><br>2 g of shale + 2 g of sulphur / 1300 °F / 1 h (light grey [light brown tone]) / irradiated with electrons at 302,831 rad[36] |
| | | mineral : steatite<br>rock : light evergreen<br>powder : white<br>origin : East Broughton, Québec |
| grey (light brown tone) darker than | 8577 | <u>production process:</u><br>2 g of steatite + 20 ml hydrofluoric acid / soaking: 24 h / drying in drying oven at 100 °F |

| | | |
|---|---|---|
| «light brown-grey» | | (white): .3 g + 50 cc of transparent polyester resin + 1% of catalyst / manual grinding / moulding / hardening (light grey [light brown tone]) / irradiated with electrons at 155,082 rad (followed at «grey [light green reflection]») |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>(followed from «brownish grey [light green tone]»)<br>powder irradiated with gamma rays at: |
| brown-grey darker than «light brown-grey» | 8578 | 102.4 Mrad[1064,1065] |
| brown-grey a bit darker and more brown | 8579 | 124.704 Mrad |
| brown-grey still a bit darker and more brown | 8580 | 148.4 Mrad |
| brown-grey still a bit darker and more brown | 8581 | 201.6 Mrad |
| brown-grey still a bit darker and more brown ↓ | 8582 | 247.6 Mrad |
| brown-grey still a bit darker and more brown | 8583 | 287.3 Mrad<br><br>(followed at «light milky chocolate-brown») |
| | | mineral : andulusite<br>rock : light brownish grey<br>powder : light grey<br>origin : Bimbowrie, South Australia<br><br>production process:<br>rock irradiated with gamma rays at: |
| brown-grey more brown and pink than «light | 8584 | 65.704 Mrad[1066] |

1637

| | | |
|---|---|---|
| brown-grey» | | |
| ↓ | 8585 | 148.4 Mrad |
| much darker brown-grey | 8586 | 201.6 Mrad |
| ↓ | | |
| still much darker brown-grey | 8587 | 244.53 Mrad |
| ↓ | | |
| still much darker brown-grey | 8588 | 360 Mrad |
| ↓ | | |
| still much darker brown-grey | 8589 | 604.53 Mrad |
| brown-grey much more intense and dark than «light brown-grey» | 8590 | mineral : steatite<br>rock : light evergreen<br>powder : white<br>origin : East Broughton, Québec<br><br>production process:<br>0↑1500 °F (light brownish grey) / powder irradiated with gamma rays at 64.7 Mrad<br><br>(followed at «dark greyish beige») |
| brown-grey much darker than «light brown-grey» | 8591 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>10 g of ochre + 100 ml sulphuric acid / soaking: 1 wk. / drying on hot plate (light brownish grey) / irradiated with gamma rays at 64.7 Mrad<br>(followed at «dark greyish beige») |
| | | mineral : Gaspé agate<br>rock : marbled nodule of shaded tints of white, pink and light grey, slightly translucid<br>powder : very light pinkish grey<br>origin : Mont Lyall, Gaspésie, Québec<br><br>production process:<br>(followed at «beige-grey») |

1638

| | | |
|---|---|---|
| brown-grey | 8592 | rock irradiated with gamma[228] rays at: 64.7 Mrad[1067] |
| ↓ | | |
| a bit darker brown-grey | 8593 | 102.4 Mrad |
| ↓ | | |
| still a bit darker brown-grey | 8594 | 148.4 Mrad |
| ↓ | | |
| still a bit darker brown-grey | 8595 | 201.6 Mrad |
| ↓ | | |
| still a bit darker brown-grey | 8596 | 247.6 Mrad |
| ↓ | | |
| a bit darker brown-grey | 8597 | 287.3 Mrad |
| ↓ | | |
| still a bit darker brown-grey | 8598 | 360 Mrad |
| ↓ | | |
| much darker brown-grey | 8599 | 424.7 Mrad |
| brown-grey | 8600 | mineral : amazonite<br>rock : light greenish turquoise<br>powder : white (turquoise reflection)<br>origin : Lac Sairs, Témiscamingue, Québec<br><br><u>production process:</u><br>(followed at «light grey»)<br>1 g of amazonite + 1 cc of synthetic white transparent enamel paint used for the car / manual grinding / application on a piece of steel sheet measuring 1" x 1" (very light grey) / irradiated with gamma rays at 57.4 Mrad<br>(followed at «pale orange-brown») |
| grey (light brown tone) | 8601 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>3 g of asbestos + 20 ml sulphuric acid / soaking: 24 h / drying on hot plate |
| | | mineral : apatite<br>rock : medium brownish red<br>powder : light pinkish beige<br>origin : Ile Calumet, Pontiac county, Québec |

| | | |
|---|---|---|
| | | production process:<br>2 g of apatite + 2 g of sodium carbonate: |
| brown-grey<br>↓ | 8602 | 0↑1300 °F + 1 h at 1300 °F |
| darker brown-grey | 8603 | 0↑1400 °F + 1 h at 1400 °F<br>(followed at «grey») |
| | | mineral : cement[82]<br>powder : medium cold grey<br>origin : Union des Carrières, Limoilou, Québec<br><br>mineral : chrome<br>powder : light grey, with metallic brilliance<br><br>production process: |
| brown-grey<br>\| | 8604 | 1.50 g of cement + .50 g of chrome / 1000 °F / 1 h |
| whitened brown-grey<br>\| | 8605 | 1.50 g of cement + .50 g of chrome / 1100 °F / 1 h |
| more whitened brown-grey<br>↓ | 8606 | 1.50 g of cement + .50 g of chrome / 1200 °F / 1 h |
| still more whitened brown-grey | 8607 | 1.50 g of cement + .50 g of chrome / 1300 °F / 1 h<br>(followed at «pale greyish beige» and «beige [light green tone]») |
| | | mineral : corundum<br>rock : medium grey<br>powder : light grey<br>origin : Transvaal, Africa<br><br>production process: |
| brown-grey<br>↓ | 8608 | 0↑1900 °F |
| brown-grey | 8609 | 0↑2000 °F |
| brown-grey | 8610 | production process:<br>(followed from «light beige»)<br>0↑1900 °F (brown-grey): 1 g + 50 ml hydrochloric acid / soaking: 2 wk. / drying on hot plate (light yellowish brown) / irradiated with electrons at 302,831 rad[45] |
| | | mineral : copper<br>rock : reddish brown, with metallic luster<br>powder : reddish brown, with metallic luster<br>origin : unknown<br><br>production process:<br>(followed at «mixture of particles: brown / green») |

1640

| | | |
|---|---|---|
| brown-grey | 8611 | rock entirely covered with 1000 ml acetic acid / natural drying / removal of crystals formed at the surface of the rock (colour of the crystals: pronounced emerald-green) / 0↑500 °F (followed at «mixture of particles: black / white / red») |
| brown-grey | 8612 | mineral : fluorine<br>rock : colourless<br>powder : colourless<br>origin : unknown<br><br><u>production process:</u><br>2 g of fluorine + 20 ml hydrofluoric acid / soaking: 24 h / drying in drying oven at 100 °F (creamy white [grey reflection]) / irradiated with gamma rays at 64.7 Mrad (followed at «medium crimson-pink [light brown tone]») |
| brown-grey | 8613 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>1 g of fluorine + 1 cc of synthetic white transparent enamel paint used for the car / manual grinding / application on a piece of steel sheet used for the car's body measuring 1" x 1" (medium beige) / irradiated with gamma rays at 5 Mrad (followed at «pinkish beige») |
| brown-grey, mat | 8614 | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 15 g<br>powder : light grey<br>origin : East Broughton, Québec<br><br><u>production process:</u><br>(followed from «orange-beige» and «iron-grey darker than "dark iron-grey"»)<br>4 g of galena powder deposited on a steatite stick / 1400 °F / 1 h (glaze: «orange [with small green spots]» on a steatite stick: «golden beige» at its surface and «dark iron-grey» in its depth / irradiated with gamma rays at 424.7 Mrad / colour of |

1641

| | | |
|---|---|---|
| | | the glaze<br>(followed at «brown», at «dark greyish brown» and «marbled and mat grey») |
| brown-grey | 8615 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «dark violet [brown tone]» and «dark violet [accentuated brown tone]»)<br>0↑1400 °F / slow cooling in furnace (indian red[107]): 2 g + 2 g of sulphur / 1700 °F / 1 h<br>(followed at «grey lighter and colder than "grey"» and «grey of various tones») |
| | | mineral : halite[41]<br>rock : colourless<br>powder : colourless<br>origin : Seleine Mine, Iles-de-la-Madeleine, Québec<br><br>production process:<br>(followed from «light iron-grey»)<br>powder filtered at 14 meshes and irradiated with gamma rays at: |
| brown-grey | 8616 | 17.1 Mrad[1069] |
| brown-grey | 8617 | 22.8 Mrad |
| brown-grey | 8618 | 28.5 Mrad<br>(followed at «amber-grey») |
| | | production process:<br>(followed from «light iron-grey»)<br>powder filtered at 42 meshes and irradiated with gamma rays at: |
| brown-grey | 8619 | 17.1 Mrad[1069] |
| brown-grey | 8620 | 22.8 Mrad |
| brown-grey | 8621 | 28.5 Mrad<br>(followed at «amber-grey») |
| | | mineral : hypersthene<br>rock : black |

| | | |
|---|---|---|
| brown-grey | 8622 | powder : medium brownish grey<br>origin : Lac Saint-Jean, Québec<br><br>production process:<br>1 g of hypersthene + 2.50 g of sodium carbonate / 1600 °F / 15 min. |
| brown-grey | 8623 | mineral : labrador<br>rock : blackish grey<br>powder : medium grey<br>origin : Lac Saint-Jean, Québec<br><br>production process:<br>1000 °C / 1 |
| brown-grey | 8624 | mineral : magnetite<br>rock : dark grey, with metallic brilliance<br>powder : dark grey<br>origin : Fosse du Labrador, Québec<br><br>production process:<br>0↑1900 °F (dark chocolate-brown): 1 g + 50 ml phosphoric acid / soaking: 2 wk. / drying on hot plate (still humid) / colour of the liquid[160] |
| brown-grey | 8625 | production process:<br>3 g of magnetite + 80 ml phosphoric acid / soaking: 2 wk. / drying on hot plate (still humid) / colour of the liquid[160] |
| brown-grey (with dark indigo blue particles) | 8626 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br>production process:<br>powder finely grinded and heated 0↑1100 °F (Naples yellow [green tone]): .50 g + 15 m sulphuric acid / soaking: 2 d. / slow drying on hot plate (very intense blue): .07 g + 6 cc of polymer used for concrete + 0.18 cc of catalyst + 1.50 thousandth of a g of cobalt 6% + 2 g of cement / manual grinding / moulding / hardening (medium greenish grey or greyish green [brown reflection], with blue particles) / irradiated with gamma rays at 18.85 Mrad |

| | | |
|---|---|---|
| grey (very, very light brown tone) | 8627 | mineral : olivine<br>powder : colourless (green reflection)<br>origin : Mount Haven, United States<br><br>production process:<br>45 g of olivine + 100 ml phosphoric acid / soaking: 3 wk. / drying on hot plate [still humid] (white) / irradiated with gamma rays at 64.7 Mrad (followed at «light beige-orange») |
| | | mineral : orthoclase<br>rock : light pinkish beige<br>powder : very light beige<br>origin : mine near Buckingham, Papineau county, Québec<br><br>production process:<br>(followed from «grey a bit darker than "very light grey"»)<br>2 g of orthoclase + 2 g of sodium carbonate: |
| brown-grey | 8628 | 0↑1500 °F + 15 min. at 1500 °F |
| brown-grey | 8629 | 0↑1500 °F + 30 min. at 1500 °F |
| brown-grey | 8630 | 0↑1500 °F + 45 min. at 1500 °F<br>(followed at «grey [light blue tone]») |
| brown-grey | 8631 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>(followed from «dark iron-grey [brown tone]»)<br>rock irradiated with gamma[228] rays at 148.4 Mrad[1070]<br>(followed at «medium chocolate-brown») |
| brown-grey | 8632 | mineral : polylithionite<br>rock : transparent (beige reflection)<br>powder : transparent (beige reflection)<br>origin : De-Mix quarry, North side of Mont Saint-Hilaire, Rouville county, Québec<br><br>production process:<br>.20 g of polylithionite + 25 ml phosphoric acid / soaking: 2 wk. / drying on hot plate (still humid) / colour of the liquid[64] |
| | | mineral : pyrite |

| | | |
|---|---|---|
| grey (light brown tone) | 8633 | rock : pale brass-yellow, with metallic brilliance<br>powder : brownish grey (with golden yellow particles)<br>origin : Noranda Mines, Noranda, Abitibi, Québec<br><br>production process:<br>5 g of pyrite + 20 ml hydrochloric acid / soaking: 3 d. / drying on hot plate[1071] |
| brown-grey of various tones | 8634 | mineral : quartz (with impurities of white kaolinite)<br>rock : opaline white, slightly translucid<br>origin : quarry near Saint-Rémi d'Amherst, Québec<br><br>production process:<br>(followed from «2 areas of the rock: the center is greyish brown; the circumference, light beige») 1600 °F / 1 h (white [grey reflection]) / rock irradiated with gamma rays at 424.7 Mrad |
| brown-grey | 8635 | mineral : shale (formation of Sillery[359])<br>rock : brownish red<br>powder : pinkish brown, mat<br>origin : bank of Saint-Lawrence river at Berthier-Sur-Mer, at the rear of the Dénechaud manor, Québec<br><br>production process:<br>3 g of shale + 25 ml sulphuric acid / soaking: 24 h / drying on hot plate |
| brown-grey | 8636 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml phosphoric acid / soaking: 2 wk. / drying on hot plate (still humid) |
| | | mineral : antigorite<br>rock : pale yellowish green<br>powder : very pale greenish yellow<br>origin : Canadian Refractories Mine, Kilmar, Québec |

| | | |
|---|---|---|
| brown-grey | 8637 | <u>production process:</u> 2 g of serpentine + 2 g of sodium carbonate / 0↑1500 °F + 30 min. at 1500 °F (creamy yellow [light green tone]) / irradiated with gamma rays at 190.22 Mrad (followed at «brownish grey [between "light brownish grey" and "medium brownish grey"]») |
| | | mineral : steatite<br>rock : light cold grey, slightly translucid<br>powder : light grey<br>origin : East Broughton, Québec<br><br><u>production process:</u><br>(followed from «grey more accentuated than "light grey"») |
| grey (light brown tone) ↓ | 8638 | 0↑1300 °F |
| grey (more accentuated brown tone) ↓ | 8639 | 0↑1400 °F |
| grey (brown tone still more accentuated) ↓ | 8640 | 0↑1500 °F |
| grey (brown tone still more accentuated) | 8641 | 0↑1600 °F<br>(followed at «light brown») |
| grey (light brown tone) | 8642 | <u>production process:</u><br>(followed from «grey [light green tone]»)<br>0↑1600 °F (brownish grey): 2 g + 25 ml hydrochloric acid / soaking: 3 d. / drying on hot plate<br>(followed at «brownish orange») |
| brown-grey | 8643 | mineral : stibnite<br>rock : dark grey, with metallic brilliance<br>powder : dark grey, with metallic brilliance<br>origin : Hunan, China<br><br>mineral : sulphur<br>rock : brilliant yellow<br>powder : brilliant yellow<br>origin : unknown<br><br><u>production process:</u><br>2 g of stibnite + 2 g of sulphur / 1300 °F / 1 h |
| | | mineral : sylvite |

| | | |
|---|---|---|
| | | rock : colourless<br>powder : colourless<br>origin : Strassfurt, Prussia, Germany<br><br>production process:<br>rock irradiated with neutrons at<br>$10^{12}$ neutrons / $cm^2$ / sec. during: |
| brown-grey<br>↓ | 8644 | 300 seconds |
| brown-grey | 8645 | 600 seconds<br>(followed at «intense caramel-brown») |
| | | mineral : tremolite<br>rock : medium brown (evergreen tone)<br>powder : greyish beige<br>origin : Tetreault Mine, Montauban, Portneuf county, Québec<br>mineral : zirconium silicate<br>powder : white (very light yellow reflection)<br>origin : Sial Company, Québec<br>production process: |
| brown-grey | 8646 | 1 g of tremolite + 1.50 g of sodium carbonate / 1600 °F / 3 h (dark grass-green): .50 g + .50 g of zirconium silicate / 1600 °F / 1 h (light grey) / irradiated with gamma rays at 63.984 Mrad[1072]<br>(followed at «beige») |
| | | mineral : milky quartz<br>rock : milky white, translucid<br>origin : Ferme Adam, Bonsecours, Eastern Townships, Québec<br>production process:<br>(followed from «beige-grey or greyish beige darker than "light beige-grey or greyish beige"»)<br>rock irradiated with gamma rays at: |
| accentuated brown-grey<br>¦ | 8647 | 102.4 Mrad |
| darker and more accentuated brown-grey<br>¦ | 8648 | 148.4 Mrad |
| darker and more accentuated brown-grey<br>↓ | 8649 | 201.6 Mrad |
| darker and more accentuated brown-grey | 8650 | 247.6 Mrad<br>(followed at «light cold grey») |
| | | mineral : molybdenite[103]<br>rock : medium grey, with metallic brilliance |

1647

| | | |
|---|---|---|
| | | powder : medium grey, with metallic brilliance<br>origin : Anglo American Molybdenite Mine, near Lamotte, Preissiac district, Abitibi, Québec<br><br>production process:<br>(followed from «light metallic grey»)<br>powder finely grinded and heated: |
| brown-grey, with white metallic brilliance<br>↓ | 8651 | 0↑1500 °F |
| darker brown-grey with white metallic brilliance | 8652 | 0↑1600 °F |
| | | mineral : pyrite<br>rock : pale brass-yellow, with metallic brilliance<br>powder : brownish grey (with golden yellow particles)<br>origin : Noranda Mines, Noranda, Abitibi, Québec<br><br>production process:<br>rock irradiated with gamma rays at: |
| brown-grey a bit darker than «brown-grey» | 8653 | 10 Mrad[1074] |
| \| | 8654 | 57.4 Mrad |
| darkens and | 8655 | 65.704 Mrad |
| \| | 8656 | 102.4 Mrad |
| \| | 8657 | 148.4 Mrad |
| becomes more | 8658 | 201.6 Mrad |
| brown \| | 8659 | 244.53 Mrad[1075] |
| \| | 8660 | 247.6 Mrad |
| \| | 8661 | 287.3 Mrad[1076] |
| \| | 8662 | 360 Mrad |
| ↓ | 8663 | 425.704 Mrad[1077]<br>(followed at «medium chocolate-brown») |
| brown-grey much darker [brown] than «brown-grey» [with more yellow golden particles] | 8664 | production process:<br>rock irradiated with gamma rays at 484.704 Mrad[239,681] |
| | | mineral : anorthosite<br>rock : light grey<br>powder : very, very light greyish beige<br>origin : rang Sainte-Germaine, Oka, Québec |

| | | |
|---|---|---|
| brown-grey darker than «brown-grey» | 8665 | production process:<br>powder irradiated with gamma rays at 64.7 Mrad (followed at «brown-grey») |
| brown-grey [between «light» and «medium» brown-grey], colder, (less brown and without any green tone) | 8666 | mineral : peridotite<br>rock : medium grey<br>powder : medium brownish grey (green reflection)<br>origin : Thetford Mines, Québec<br><br>production process:<br>powder irradiated with electrons at 302,831 rad[36] |
| brown-grey [between «light» and «medium» brown-grey] | 8667 | mineral : antigorite<br>rock : pale yellowish green<br>powder : very pale greenish yellow<br>origin : Canadian Refractories Mine, Kilmar, Québec<br><br>production process:<br>(followed from «brownish grey»)<br>2 g of antigorite + 2 g of sodium carbonate / 0↑1500 °F + 30 min. at 1500 °F (creamy yellow [light green tone]) / irradiated with gamma rays at 550.22 Mrad |
| brown-grey a bit more pale than «medium brown-grey» | 8668 | mineral : galena<br>rock : dark grey, with metallic brilliance<br>powder : dark grey, with metallic brilliance<br>origin : Trail, British Columbia<br><br>production process:<br>1300 °F / 1 h (medium grey) / powder irradiated with electrons at 302,831 rad[36] |
| | | mineral : mussel shell or calcium carbonate<br>shell : dark indigo-blue (violet tone)<br>powder : white<br>origin : bank of Saint-Lawrence river, Baie-des-Chaleurs, Gaspésie, Québec<br><br>mineral : sulphur<br>rock : brilliant yellow<br>powder : brilliant yellow |

| | | |
|---|---|---|
| brown-grey a bit more pale than «medium brown-grey» | 8669 | origin : unknown<br><br>production process:<br>2 g of powder + 2 g of sulphur / 1300 °F / 1 h (mixture of particles: medium brownish grey / white) / irradiated with electrons at 302,831 rad[36] |
| brown-grey a bit lighter than «medium brown-grey» | 8670 | mineral : obsidian<br>rock : very dark smoky grey, almost black<br>powder : light grey<br>origin : Arkansas, United States<br><br>production process:<br>2 g of obsidian + 2 g of sodium carbonate / 0↑1500 °F + 30 min. at 1500 °F (medium brownish grey) / irradiated with gamma[239] rays at 64.7 Mrad (followed at «brownish grey more grey, darker and more accentuated than "medium brownish grey"») |
| brown-grey lighter than «medium brown-grey» | 8671 | mineral : galena<br>rock : dark grey, with metallic brilliance<br>powder : dark grey, with metallic brilliance<br>origin : Trail, British Columbia<br><br>production process:<br>20 g of galena + 100 ml sulphuric acid / soaking: 24 h / drying on hot plate (medium greyish brown) / irradiated with gamma rays at 64.7 Mrad (followed at «dark milky chocolate-brown [light grey tone]») |
| brown-grey much lighter than «medium brown-grey» | 8672 | mineral : cobalt sulphide[597]<br>rock : dark grey, with metallic brilliance<br>powder : dark grey<br>origin : Cobalt, Ontario<br><br>production process:<br>4 g of cobalt sulphide + 20 ml hydrochloric acid / soaking: 24 h / separation of the liquid and the solid / drying on hot plate (colour of the solid: medium brownish grey[55,1080]) / irradiated with gamma rays at 64.7 Mrad (followed at «medium greyish brown») |
| | | mineral : peridotite<br>rock : medium grey<br>powder : medium brownish grey (green reflection)<br>origin : Thetford Mines, Québec |

1650

| | | |
|---|---|---|
| medium brown-grey | 8672.1 | production process:<br>1 g of peridotite + 5 g of pyrex / manual grinding / heating: 5 °C per min. 0↑1245 °C + maintenace during 1 h / cooling: 5 °C per min. until ambient temperature is reached / the entity is done in ambient air |
| medium brown-grey | 8672.2 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>1 g of molybdenite + 6.50 g of glass powder (spruce pine batch) / manual grinding / deposited on a ceramic plate at the state of a biscuit / heating in a furnace 0↑1000 °C in ambient air / slow cooling in furnace (areas: light Naples yellow / old rose / milky white) / irradiated with gamma rays at 2.47 Mrad |
| medium brown-grey | 8673 | mineral : amethyst<br>rock : violet, translucid<br>powder : light grey (lilac tone)<br>origin : Thunderbay, Ontario<br><br>production process:<br>(followed from «lilac-grey»)<br>powder irradiated with electrons at 302,831 rad[45] |
| medium brown-grey | 8674 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>(followed from «brownish grey darker than "very brownish grey"» and «light olive-green»)<br>0↑2000 °F (very light grey [cristalline and translucid]) / powder irradiated with gamma rays at 424.7 Mrad[1078]<br>(followed at «medium olive-green») |
| | | mineral : anorthosite<br>rock : dark grey<br>powder : medium grey |

| | | |
|---|---|---|
| | | origin : Jonquière, Lac Saint-Jean, Québec<br><br>production process: |
| medium brown-grey | 8675 | (followed from «brown darker than "light brown"») 6 g of anorthosite + 50 ml sulphuric acid / soaking: 2 wk. / drying on hot plate (light grey) / irradiated with gamma rays at 424.7 Mrad |
| medium brown-grey | 8676 | production process:<br>0↑1900 °F (medium brown): .30 g + 50 ml sulphuric acid / soaking: 2 wk. / separation of the liquid and the solid / drying on hot plate / colour of the solid[455] |
| | | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>production process:<br>2 g of apatite + 2 g of sodium carbonate: |
| medium brown-grey | 8677 | 0↑1300 °F + 1 h at 1300 °F |
| ↓ | | |
| medium brown-grey | 8678 | 0↑1400 °F + 1 h at 1400 °F<br>(followed at «very light beige») |
| | | mineral : bauxite[92]<br>powder : pinkish beige, mat<br>origin : Alcan Company, French Guyana<br><br>production process: |
| medium brown-grey | 8679 | 3 g of bauxite + 25 ml sulphuric acid / soaking: 24 h / drying on hot plate |
| medium brown-grey | 8680 | production process:<br>15 g of bauxite + 100 ml phosphoric acid / soaking: 3 wk. / drying on hot plate (still humid) |
| | | mineral : beryl<br>rock : light blue (near turquoise), slightly translucid<br>powder : light grey<br>origin : Lacorne district, Abitibi, Québec<br><br>mineral : sulphur<br>rock : brilliant yellow<br>powder : brilliant yellow<br>origin : unknown |

| | | |
|---|---|---|
| medium brown-grey | 8681 | <u>production process:</u><br>1 g of beryl + 2 g of sodium carbonate + 1 g of sulphur / 1600 °F / 1 h |
| medium brown-grey | 8682 | mineral : beryl<br>rock : intense grass-green, slightly translucid<br>powder : greenish grey<br>origin : unknown<br><br><u>production process:</u><br>1500 °F / 1 h |
| medium brown-grey | 8683 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «apple-green darker than "light apple-green"»)<br>2 g of bornite + 15 ml nitric acid + 10 ml hydrochloric acid / soaking: 6 d. / separation of the liquid and the solid / natural drying (colour of the liquid: mixture of particles[404]: bluish green / light and vivid apple-green) / irradiated with gamma rays at 425.65 Mrad |
| medium brown-grey<br>↓<br>medium brown-grey | 8684<br><br>8685 | mineral : calcite<br>rock : light pink<br>powder : pinkish white<br>origin : Huddersfield district, Pontiac county, Québec<br><br><u>production process:</u><br>0↑1800 °F<br><br>0↑2000 °F |
| medium brown-grey | 8686 | mineral : calcite (with clayey inclusions)<br>rock : very light creamy yellow, translucid<br>powder : white<br>origin : De-Mix quarry, near Saint-Philippe de Laprairie, Québec<br><br><u>production process:</u><br>(followed from «light grey»)<br>rock hermetically wrapped in bread dough / 1600 °F / 1 h (slightly translucid white) / irradiated |

1653

| | | |
|---|---|---|
| | | with electrons at 305,200 rad[46] |
| | | mineral : chalcopyrite<br>powder : dark grey (light green tone)<br>origin : Centre de recherche des Mines Noranda in Montréal, Québec<br><br>production process: |
| medium brown-grey | 8687 | 4 g of chalcopyrite + 50 ml phosphoric acid / soaking: 4 wk. / drying on hot plate (still humid) / colour of the solid[30] |
| | | mineral : cement[269]<br>powder : medium brownish grey<br>origin : CALCO, Charlesbourg, Québec<br><br>mineral : chrome<br>powder : light grey, with metallic brilliance<br><br>production process: |
| medium brown-grey | 8688 | 1.50 g of cement + .50 g of chrome / 1000 °F / 1 h |
| lighter brown-grey | 8689 | 1.50 g of cement + .50 g of chrome / 1100 °F / 1 h |
| still lighter brown-grey | 8690 | 1.50 g of cement + .50 g of chrome / 1200 °F / 1 h |
| lighter brown-grey | 8691 | 1.50 g of cement + .50 g of chrome / 1300 °F / 1 h (followed at «light greyish beige») |
| still lighter brown-grey | 8692 | 1.50 g of cement + .25 g of chrome / 1325 °F / 1 h (followed at «grey [light green tone]») |
| | | mineral : fluorine<br>rock : very pale yellow, translucid<br>powder : white (light yellow reflection)<br>origin : Ohio, United States<br><br>mineral : sulphur<br>rock : brilliant yellow<br>powder : brilliant yellow<br>origin : unknown<br><br>production process: |
| medium brown-grey | 8693 | 1 g of fluorine + 1 g of sulphur / 1600 °F / 1 h (followed at «very light grey») |

1654

| | | |
|---|---|---|
| medium brown-grey | 8694 | mineral : galena<br>rock : dark grey, with metallic brilliance<br>powder : dark grey, with metallic brilliance<br>origin : Trail, British Columbia<br><br>production process:<br>15 g of galena + 100 ml phosphoric acid / soaking: 24 h / drying on hot plate |
| medium brown-grey | 8695 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process:<br>(followed from «brownish grey [light violet-pink reflection], between "medium brownish grey [light violet-pink reflection]" and "brownish grey [light violet-pink reflection]" darker than "medium brownish grey [light violet-pink reflection]"»)<br>1 g of goethite + 1 g of sulphur + 2 g of zirconium silicate / 1500 °F / 1 h<br>(followed at «medium brownish grey [light violet-pink reflection]») |
| medium brown-grey | 8696 | production process:<br>1 g of goethite + 1 g of sulphur + 1 g of zirconium silicate / 1500 °F / 1 h<br>(followed at «brownish grey [light violet-pink reflection] darker than "medium brownish grey [light violet-pink reflection]"») |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : feldspar |

1655

| | | |
|---|---|---|
| medium brown-grey | 8697 | rock : white, opaque<br>powder : white<br>origin : Baraute, Abitibi, Québec<br><br>mineral : titanium dioxide<br>powder : white<br>origin : NL Chem Canada Inc., Québec<br><br>production process:<br>(followed from «dark brown [orange-red tone]»)<br>0↑1400 °F / slow cooling in furnace (indian red[107]): 1.50 g + 1.50 g of feldspar (dark reddish brown): .50 g + .50 g of sulphur + .50 g of titanium dioxide / deposited in a porcelain crucible closed with a cover / the entity is hermetically wrapped in bread dough / 1600 °F / 30 min. |
| medium grey (light brown tone) | 8698 | mineral : halite[41]<br>rock : colourless<br>powder : colourless<br>origin : Seleine Mine, Iles-de-la-Madeleine, Québec<br><br>production process:<br>(followed from «light brownish grey»)<br>rock irradiated with electrons at 164,800 rad (light grey [light blue tone]), then at 155,082 rad (light lemon-yellow), then with gamma rays at 10 Mrad[1079]<br>(followed at «blackish brown») |
| medium brown-grey | 8699 | mineral : hypersthene<br>rock : black<br>powder : medium brownish grey<br>origin : Lac Saint-Jean, Québec<br><br>production process:<br>2 g of hypersthene + 20 ml sulphuric acid / soaking: 3 d. / drying on hot plate |
| medium brown-grey | 8700 | mineral : labrador<br>rock : blackish grey<br>powder : medium grey<br>origin : Lac Saint-Jean, Québec<br><br>production process:<br>1000 °C / 1 h (medium greyish beige) / powder irradiated with electrons at 302,831 rad[36] |
| | | mineral : molybdenite[48] (flakes of $MoS_2$ + pegmatite [quartz + bismuth]) |

1656

| | | |
|---|---|---|
| medium brown-grey [with accentuated blue particles] | 8701 | rock : transparent and grey<br>powder : medium cold grey<br>origin : Lamotte, Abitibi, Québec<br><br>production process:<br>(followed from «beige [grey tone with a localized blue reflection] or grey [beige tone with a localized blue reflection], much more accentuated than "light brownish grey" or "light greyish beige"»)<br>6 g of molybdenite + 50 ml sulphuric acid / soaking: 4 years / drying on hot plate (light grey [with blue particles]) / irradiated with gamma rays at 424.7 Mrad |
| medium brown-grey | 8702 | mineral : ochre[98]<br>powder : yellow<br>origin : small copper and nickel deposit, in the South-Western area of a mass of serpentinite at 3 km at the West of Saint-Fabien-de-Panet, Québec<br><br>production process:<br>3 g of ochre + 20 ml hydrofluoric acid / soaking: 24 h / drying in drying oven at 100 °F |
| medium brown-grey | 8703 | mineral : quartz<br>rock : light pink, translucid<br>powder : very light grey<br>origin : unknown<br><br>mineral : sulphur<br>rock : brilliant yellow<br>powder : brilliant yellow<br>origin : unknown<br><br>production process:<br>1 g of quartz + 1 g of sulphur / 1700 °F / 1 h |
| medium grey (light brown tone) | 8704 | mineral : shale (formation of Sillery[339])<br>rock : brownish red<br>powder : pinkish brown, mat<br>origin : bank of Saint-Lawrence river at Berthier-Sur-Mer, at the rear of the Dénechaud manor, Québec<br><br>production process:<br>3 g of shale + 20 ml hydrofluoric acid / soaking: 24 h / drying in drying oven at 100 °F |
| | | mineral : antigorite<br>rock : pale yellowish green<br>powder : very pale greenish yellow<br>origin : Canadian Refractories Mine, Kilmar, |

1657

| | | |
|---|---|---|
| | | Québec |
| | | <u>production process:</u> |
| | | 2 g of antigorite + 2 g of sodium carbonate / |
| | | 0↑1500 °F + 45 min. at 1500 °F (creamy yellow |
| | | [green tone]) / irradiated with gamma rays at: |
| medium brown-grey | 8705 | 190.22 Mrad |
| ↓ | | |
| medium brown-grey | 8706 | 350.22 Mrad |
| | | mineral : siderite |
| | | rock : caramel-brown (grey tone) |
| | | powder : light orange-beige |
| | | origin : De-Mix quarry, North side of Mont Saint-Hilaire, Rouville county, Québec |
| | | mineral : calcite |
| | | rock : light pink |
| | | powder : pinkish white |
| | | origin : Huddersfield district, Pontiac county, Québec |
| | | <u>production process:</u> |
| medium brown-grey | 8707 | 1 g of siderite + 1 g of calcite / 1000 °C / 1 h |
| | | mineral : spodumene |
| | | rock : pale green |
| | | powder : light grey, almost white |
| | | origin : Québec Lithium Co., Baraute, Abitibi, Québec |
| | | <u>production process:</u> |
| medium brown-grey | 8708 | 0↑1900 °F |
| | | <u>production process:</u> |
| medium brown-grey | 8709 | 2000 °F / 1 h |
| | | mineral : steatite |
| | | rock : light evergreen |
| | | powder : white |
| | | origin : East Broughton, Québec |
| | | <u>production process:</u> |
| medium brown-grey | 8710 | 40 g of steatite + 100 ml phosphoric acid / soa- |
| | | king: 3 wk. / separation of the liquid (1st) and |
| | | the solid / addition of 100 ml phosphoric acid to |
| | | the same solid / soaking: 3 wk. / separation of |

1658

| | | |
|---|---|---|
| | | the liquid (2nd) and the solid / drying on hot plate (still humid) / colour of the solid[347] |
| medium brown-grey | 8711 | mineral : stilbite<br>rock : white (honey-yellow reflection)<br>powder : white (honey-yellow reflection)<br>origin : Lac d'amiante Mine, Black Lake, Québec<br><br>production process:<br>1 g of stilbite + 1 g of sodium carbonate / 1600 °F / 1 h |
| medium brown-grey | 8712 | mineral : cobalt sulphide[597]<br>rock : dark grey, with metallic brilliance<br>powder : dark grey<br>origin : Cobalt, Ontario<br><br>production process:<br>4 g of cobalt sulphide + 20 ml hydrochloric acid / soaking: 24 h / separation of the liquid and the solid / drying on hot plate / colour of the solid[55,1080] |
| medium brown-grey | 8713 | production process:<br>4 g of cobalt sulphide + 20 ml hydrofluoric acid / soaking: 24 h / drying in drying oven at 100°F[1081] |
| medium brown-grey | 8714 | mineral : obsidian<br>rock : very dark smoky grey, almost black<br>powder : light grey<br>origin : Arkansas, United States<br><br>production process:<br>(followed from «light grey»)<br>2 g of obsidian + 2 g of sodium carbonate / 0↑1500 °F + 30 min. at 1500 °F<br>(followed at «mixture of particles: greyish green / brown») |
| brown-grey very slightly darker than «medium brown-grey» | 8715 | mineral : dolomite<br>rock : light grey<br>powder : light grey<br>origin : Shefferville, Ungava, Québec<br><br>production process:<br>1 g of dolomite + 1 cc of white transparent printing ink / mechanical grinding / 10 superimpositions on white glazed paper (medium brownish grey) / irradiated with gamma rays at 11.4 Mrad[89,1082] |

1659

| | | |
|---|---|---|
| brown-grey very slightly darker than «medium brown-grey» | 8716 | mineral : orthoclase<br>rock : white (grey reflection)<br>powder : white (grey reflection)<br>origin : mine near Buckingham, Papineau county, Québec<br><br>production process:<br>1 g of orthoclase + 1 cc of white transparent printing ink / mechanical grinding / 8 superimpositions on white glazed paper (medium brownish grey) / irradiated with gamma rays at 11.4 Mrad[89,1082] |
| brown-grey a bit darker than «medium brown-grey» | 8717 | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>production process:<br>2 g of apatite + 2 g of sodium carbonate / 0↑1300 °F + 1 h at 1300 °F (medium brownish grey) / irradiated with electrons at 302,831 rad[36] |
| | | mineral : cinnabar<br>rock : medium grey (with red traces at the surface)<br>origin : unknown<br><br>production process:<br>(followed from «grey much darker than "medium grey"»)<br>rock irradiated with gamma rays at: |
| medium brown-grey | 8718 | 10 Mrad |
| which becomes a | 8719 | 63.984 Mrad |
| | 8720 | 102.4 Mrad |
| little | 8721 | 148.4 Mrad |
| more | 8722 | 201.6 Mrad |
| brown at | 8723 | 242.804 Mrad |
| | 8724 | 247.6 Mrad |
| ↓ | 8725 | 287.3 Mrad |
| each step | 8726 | 360 Mrad |
| | | (followed at «medium milky chocolate-brown») |
| | | mineral : chromite<br>rock : blackish grey<br>powder : medium brownish grey<br>origin : Black Lake, near Thetford Mines, Québec |

1660

| | | |
|---|---|---|
| | | <u>production process:</u><br>powder irradiated with gamma[239] rays at: |
| medium brown-grey which darkens and becomes a bit | 8727 | 5 Mrad |
| | 8728 | 5.7 Mrad |
| | 8729 | 10 Mrad |
| | 8730 | 57.4 Mrad |
| | 8731 | 64.7 Mrad |
| more | 8732 | 102.4 Mrad |
| brown | 8733 | 148.4 Mrad |
| at | 8734 | 201.6 Mrad |
| | 8735 | 247.6 Mrad |
| ↓ | 8736 | 287.3 Mrad |
| each step | | (followed at «dark brown») |
| | | mineral : beryl<br>rock : light blue, slightly translucid<br>powder : light grey<br>origin : Abitibi, Québec |
| | | <u>production process:</u><br>.3 g of beryl + 50 cc of transparent polyester resin + 1% of catalyst / manual grinding / moulding / hardening (medium brownish grey) / irradiated with electrons at: |
| brown-grey a bit darker than «medium brown-grey»<br>↓ | 8737 | 155,082 rad |
| brown-grey a bit darker and more intense | 8738 | 305,082 rad[354] |
| | | mineral : cement[82]<br>powder : medium cold grey<br>origin : Union des Carrières, Limoilou, Québec |
| | | <u>production process:</u><br>powder irradiated with gamma rays at: |
| brown-grey a bit darker than «medium brown-grey» | 8739 | 57.4 Mrad |
| brown-grey still slightly darker and more brown | 8740 | 65.704 Mrad |
| brown-grey still slightly darker and more brown | 8741 | 102.4 Mrad |
| darker brown-grey | 8742 | 124.704 Mrad |

1661

| | | |
|---|---|---|
| ↓<br>slightly darker brown-grey | 8743 | 148.4 Mrad[1062]<br>(followed at «brown more pale than "medium brown"») |
| | | mineral : corundum<br>rock : medium grey<br>powder : light grey<br>origin : Transvaal, Africa<br><br>production process:<br>rock irradiated with gamma rays at: |
| grey (light brown tone) a bit darker than «medium brown-grey» | 8744 | 5 Mrad |
| ↓<br>grey (accentuated brown tone) still a bit darker | 8745 | 10 Mrad |
| ↓<br>grey (accentuated brown tone) still a bit darker | 8746 | 57.4 Mrad |
| ↓<br>grey (accentuated brown tone) still a bit darker | 8747 | 63.984 Mrad<br><br>(followed at «greyish brown») |
| | | mineral : labrador<br>rock : blackish grey<br>powder : medium grey<br>origin : Lac Saint-Jean, Québec<br><br>production process: |
| brown-grey a bit darker than «medium brown-grey» | 8748 | powder irradiated with electrons at<br>162,431 rad |
| | | mineral : labradorite<br>rock : bluish green<br>powder : light grey (light green tone)<br>origin : Chicoutimi county, Québec<br><br>production process:<br>1 g of labradorite + 1 cc of white transparent printing ink / mechanical grinding / 8 superimpositions on white glazed paper (medium grey [very light brown tone]) / irradiated with gamma rays at: |
| medium grey (light brown tone) a bit darker than «medium brown-grey» | 8749 | 5.7 Mrad |

| | | |
|---|---|---|
| ↓<br>grey (very light brown tone) still a bit darker | 8750 | 11.4 Mrad[1083] |
| brown-grey a bit darker than «medium brown-grey» | 8751 | mineral : mussel shell or calcium carbonate<br>shell : dark indigo-blue (violet tone)<br>powder : white<br>origin : bank of Saint-Lawrence river, Baie-des-Chaleurs, Gaspésie, Québec<br><br>mineral : sulphur<br>rock : brilliant yellow<br>powder : brilliant yellow<br>origin : unknown<br><br>production process:<br>2 g of powder + 2 g of sulphur / 1300 °F / 1 h (mixture of particles : medium brownish grey / white) / irradiated with gamma rays at 424.7 Mrad[81] |
| brown-grey a bit darker than «medium brown-grey» | 8752 | mineral : spodumene<br>rock : pale green<br>powder : light grey, almost white<br>origin : Québec Lithium Co., Baraute, Abitibi, Québec<br><br>production process:<br>2000 °F / 1 h (mixture of particles: medium brownish grey / white) / powder irradiated with electrons at 302,831 rad[36] |
| brown-grey darker than «medium brown-grey» | 8753 | mineral : anorthosite<br>rock : dark grey<br>powder : medium grey<br>origin : Jonquière, Lac Saint-Jean, Québec<br><br>production process:<br>powder irradiated with gamma rays at 190.22 Mrad (followed at «dark beige») |
| brown-grey darker than «medium | 8754 | mineral : beryl<br>rock : light blue, slightly translucid<br>powder : light grey<br>origin : Abitibi, Québec<br><br>production process:<br>.3 g of beryl + 50 cc of transparent polyester resin + 1% of catalyst / manual grinding / moulding |

1663

| | | |
|---|---|---|
| brown-grey» | | / hardening (medium brownish grey) / irradiated with gamma rays at 11.4 Mrad |
| brown-grey darker and more grey than «medium brown-grey» | 8755 | mineral : hypersthene<br>rock : black<br>powder : medium brownish grey<br>origin : Lac Saint-Jean, Québec<br><br>production process:<br>powder irradiated with gamma rays at 64.7 Mrad<br><br>(followed at«greyish brown [light orange reflection]») |
| brown-grey darker than «medium brown-grey» | 8756 | mineral : chromite<br>rock : blackish grey<br>powder : medium brownish grey<br>origin : Black Lake, near Thetford Mines, Québec<br><br>production process:<br>rock irradiated with gamma rays at 122.984 Mrad[509]<br>(followed at «dark chocolate-brown») |
| brown-grey darker than «medium brown-grey» | 8757 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>1 g of fluorine + 1 cc of white transparent printing ink / mechanical grinding / 10 superimpositions on white glazed paper (medium brownish grey) / irradiated with gamma rays at:<br>5.7 Mrad[1084] |
| ↓<br>brown-grey still a bit darker | 8758 | 22.8 Mrad |
| brown-grey darker | 8759 | mineral : halite[41]<br>rock : colourless<br>powder : colourless<br>origin : Seleine Mine, Iles-de-la-Madeleine, Québec<br><br>production process:<br>(followed from «medium iron-grey»)<br>rock irradiated with gamma rays at:<br>10 Mrad[1085] |

1664

| | | |
|---|---|---|
| than «medium brown-grey» | | |
| ↓ | | |
| still darker brown-grey | 8760 | 17.1 Mrad[1086] |
| ↓ | | |
| still darker brown-grey | 8761 | 22.8 Mrad |
| ↓ | | |
| still darker brown-grey | 8762 | 28.5 Mrad[1087]<br>(followed at «amber-grey [or reddish brown tone]») |
| | | mineral : labrador<br>rock : blackish grey<br>powder : medium grey<br>origin : Lac Saint-Jean, Québec |
| | | production process: |
| brown-grey darker than «medium brown-grey» | 8763 | powder irradiated with electrons at 162,431 rad |
| | | mineral : peridotite<br>rock : medium grey<br>powder : medium brownish grey (green reflection)<br>origin : Thetford Mines, Québec |
| | | production process:<br>(followed from «grey darker than "medium grey"»)<br>rock irradiated with gamma rays at: |
| brown-grey darker than «medium brown-grey» | 8764 | 57.4 Mrad |
| ↓ | | |
| brown-grey darker than «medium brown-grey» | 8765 | 65.704 Mrad<br>(followed at «dark chocolate-brown») |
| | | mineral : tourmaline<br>rock : very dark grey, almost black<br>powder : very dark grey, almost black<br>origin : Villeneuve Mine, Papineau county, Québec |
| | | production process:<br>2 g of tourmaline + 25 ml nitric acid / soaking: 3 d. / drying on hot plate (medium cold iron-grey) / irradiated with gamma rays at: |
| brown-grey darker than «medium brown-grey» | 8766 | 64.7 Mrad |
| ↓ | | |

| | | |
|---|---|---|
| brown-grey darker than «medium brown-grey» | 8767 | 424.7 Mrad |
| | | mineral : obsidian<br>rock : very dark smoky grey, almost black<br>powder : light grey<br>origin : Arkansas, United States<br><br>production process:<br>(followed at «brownish grey a bit lighter than "medium brownish grey"»)<br>2 g of obsidian + 2 g of sodium carbonate / 0↑1500 °F + 30 min. at 1500 °F (medium brownish grey) / irradiated with gamma[239] rays at 424.7 Mrad |
| brown-grey more grey, accentuated and darker than «medium brown-grey» | 8768 | |
| | | mineral : calcite<br>rock : light pink<br>powder : pinkish white<br>origin : Huddersfield district, Pontiac county, Québec<br><br>production process:<br>0↑2000 °F (medium brownish grey) / powder irradiated with gamma rays at: |
| brown-grey darker and more intense than «medium brown-grey»<br>↓ | 8769 | 64.7 Mrad |
| brown-grey much darker and more intense | 8770 | 424.7 Mrad[1088] |
| | | mineral : spodumene<br>rock : pale green<br>powder : light grey, almost white<br>origin : Québec Lithium Co., Baraute, Abitibi, Québec<br><br>production process: |
| brown-grey much darker than «medium brown-grey» | 8771 | 2000 °F / 1 h (medium brownish grey) / powder irradiated with gamma rays at 124.70 Mrad[433]<br>(followed at «greyish brown») |
| | | mineral : galena<br>rock : dark grey, with metallic brilliance<br>powder : dark grey, with metallic brilliance<br>origin : Trail, British Columbia |

| | | |
|---|---|---|
| brown-grey more grey and much darker than «medium brown-grey» | 8772 | production process:<br>15 g of galena + 100 ml hydrochloric acid / soaking: 24 h / drying on hot plate (medium brownish grey) / irradiated with gamma rays at 64.7 Mrad (followed at «very dark iron-grey, almost black») |
| brown-grey much darker than «medium brown-grey» | 8773 | mineral : olivine<br>powder : colourless (green reflection)<br>origin : Mount Haven, United States<br><br>production process:<br>(followed from «light brown»)<br>.26 g of olivine + 50 cc of transparent polyester resin + 1% of catalyst / manual grinding / moulding / hardening (medium brownish grey) / irradiated with electrons at 305,082 rad[354] |
| brown-grey a bit darker than «dark brown-grey» | 8774 | mineral : cerite<br>rock : dark brownish grey<br>powder : light grey (light brown tone)<br>origin : Jamestown, Boulder county, Colorado, United States<br><br>production process:<br>rock irradiated with gamma rays at 63.984 Mrad[1089]<br>(followed at «dark chocolate-brown») |
| brown-grey a bit darker than «dark brown-grey» | 8775 | production process:<br>rock irradiated with electrons at 164,800 rad |
| brown-grey or grey-brown [between «medium» and «dark» brown-grey or grey-brown] | 8776 | mineral : calcite<br>rock : light pink<br>powder : pinkish white<br>origin : Huddersfield district, Pontiac county, Québec<br><br>production process:<br>1600 °F / 1 h |
| | | mineral : molybdenite[103]<br>rock : medium grey, with metallic brilliance<br>powder : medium grey, with metallic brilliance |

1667

| | | |
|---|---|---|
| brown-grey [between «medium» and «dark» brown-grey] | 8777 | origin : Anglo American Molybdenite Mine, near Lamotte, Preissiac district, Abitibi, Québec<br><br>production process:<br>(followed from «metallic grey darker than "dark metallic grey"»)<br>powder finely grinded and irradiated with gamma[239] rays at 484.704 Mrad |
| brown-grey a bit more pale than «dark brown-grey» | 8778 | mineral : smaltite[25], variety of skutterudite<br>rock : dark iron-grey, with silver metallic brilliance<br>powder : dark grey<br>origin : Cobalt, Ontario<br><br>production process:<br>(followed from «grey much more pale and cold than "dark grey"»)<br>powder irradiated with gamma[239] rays at 424.7 Mrad |
| brown-grey a bit more pale than «dark brown-grey» | 8779 | mineral : vesuvianite<br>rock : lilac<br>powder : lilac<br>origin : John Mansville Mine, Asbestos, Québec<br><br>production process:<br>1 g of vesuvianite + 1 g of sodium carbonate / 1700 °F / 1 h (dark brownish grey) / irradiated with gamma[228] rays at 65.65 Mrad<br>(followed at «very dark brownish grey, almost black») |
| brown-grey much lighter than «dark brown-grey» | 8780 | mineral : nickel<br>powder : dark brownish grey, with metallic brilliance<br><br>production process:<br>powder irradiated with gamma[239] rays at 64.7 Mrad<br>(followed at «brownish grey darker than "dark brownish grey"») |
| | | mineral : galena<br>rock : dark grey, with metallic brilliance<br>powder : dark grey, with metallic brilliance<br>origin : Gisement Sullivan, Co. COMINCO, Co-Trail, British Columbia |

| | | |
|---|---|---|
| brown-grey a bit lighter and more brown than «dark brown-grey» | 8781 | production process:<br>(followed from «grey darker and colder than "dark grey"»)<br>powder irradiated with gamma$^{239}$ rays at 424.7 Mrad |
| dark brown-grey | 8782 | mineral : agate<br>rock : dark grass-green, slightly translucid<br>powder : light grey (light green tone)<br>origin : bank of Saint-Lawrence river, region of Maria, Gaspésie, Québec<br><br>production process:<br>(followed from «dark greenish grey»)<br>1 g of agate + 1 cc of synthetic white transparent enamel paint used for the car / manual grinding / application on a piece of steel sheet used for the car's body measuring 1" x 1" (greenish grey) / irradiated with gamma rays at 360 Mrad |
| dark brown-grey | 8783 | mineral : beryl<br>rock : intense grass-green, slightly translucid<br>powder : greenish grey<br>origin : unknown<br><br>mineral : sulphur<br>rock : brilliant yellow<br>powder : brilliant yellow<br>origin : unknown<br><br>production process:<br>1 g of beryl + 2 g of sodium carbonate + 1 g of sulphur / 1600 °F / 1 h |
| dark brown-grey | 8784 | mineral : bornite<br>rock : reddish brown (with localized green and bluish green oxidation)<br>powder : reddish brown<br>origin : Lac Musset, Fosse du Labrador, Québec<br><br>production process:<br>(followed from «greenish turquoise a bit more pale than "light greenish turquoise"»)<br>2 g of bornite + 25 ml hydrochloric acid / soaking: 6 d. / separation of the liquid and the solid / natural drying (colour of the liquid: light greenish turquoise) / irradiated with gamma rays at 425.65 Mrad |

1669

| | | |
|---|---|---|
| dark brown-grey | 8785 | mineral : fluorescent calcite<br>rock : white (localized grey or brown reflection), translucid<br>powder : white (yellow reflection)<br>origin : Bancroft, Ontario<br><br>production process:<br>4 g of calcite + 20 ml nitric acid / soaking: 3 d. / separation of the liquid and the solid / drying on hot plate / colour of the solid[79,1090] |
| dark grey (light brown tone) | 8786 | mineral : chalcopyrite<br>rock : brass-yellow, with metallic luster<br>powder : dark grey (with golden particles)<br>origin : Noranda Mines, Noranda, Abitibi, Québec<br><br>mineral : sulphur<br>rock : brilliant yellow<br>powder : brilliant yellow<br>origin : unknown<br><br>production process:<br>2 g of chalcopyrite + 2 g of sulphur / 1300 °F / 1 h |
| dark brown-grey | 8787 | mineral : chalcopyrite<br>powder : dark grey (light green tone)<br>origin : Centre de recherche des Mines Noranda in Montréal, Québec<br><br>production process:<br>(followed from «grey a bit more pale than "light grey"»)<br>4 g of chalcopyrite + 100 ml sulphuric acid / soaking: 2 wk. / drying on hot plate (light grey) / irradiated with gamma rays at 424.7 Mrad |
| dark brown-grey | 8788 | mineral : coal<br>rock : black<br>powder : brownish black<br>origin : bank of Saint-Lawrence river, city of Québec, Québec<br><br>production process:<br>2 g of coal + 25 ml sulphuric acid / soaking: 24 h / drying on hot plate |
| | | mineral : chromite[294]<br>rock : dark grey |

| | | |
|---|---|---|
| | | powder : dark grey<br>origin : Black Lake, Eastern Townships, Québec<br><br>production process:<br>4 g of chromite + 20 ml nitric acid / soaking: 3 d. / drying on hot plate |
| dark brown-grey | 8789 | |
| dark brown-grey or grey-brown | 8790 | mineral : chromite<br>rock : blackish grey<br>powder : medium brownish grey<br>origin : Black Lake, near Thetford Mines, Québec<br><br>production process:<br>4 g of chromite + 100 ml sulphuric acid / soaking: 4 years / drying on hot plate / colour of the solid[1091] |
| dark brown-grey | 8791 | production process:<br>0↑1900 °F (medium chocolate-brown): 1 g + 50 ml sulphuric acid / soaking: 2 wk. / drying on hot plate (profound green) / irradiated with electrons at 162,431 rad |
| dark brown-grey | 8792 | mineral : cement[82]<br>powder : medium cold grey<br>origin : Union des Carrières, Limoilou, Québec<br><br>mineral : chrome<br>powder : light grey, with metallic brilliance<br><br>production process:<br>(followed from «blackish brown»)<br>1.50 g of cement + .50 g of chrome / 2450 °F / 1 h |
| dark brown-grey | 8793 | mineral : fluorine<br>rock : white (pink reflection), translucid<br>powder : white (grey reflection)<br>origin : Saint-Lawrence Fluorspar Company, Saint-Lawrence, Newfoundland<br><br>mineral : cement[1138]<br>powder : white<br><br>production process:<br>5 g of rocks of various sizes + 13.74 g of cement + 6.50 cc of water / manual mixing / moulding / hardening / irradiated with gamma rays at 18.85 Mrad[1092] |
| | | mineral : fluorine<br>rock : very pale yellow, translucid |

| | | |
|---|---|---|
| dark brown-grey | 8794 | powder : white (light yellow reflection)<br>origin : Ohio, United States<br><br>mineral : sulphur<br>rock : brilliant yellow<br>powder : brilliant yellow<br>origin : unknown<br><br>production process:<br>1 g of fluorine + 2 g of sodium carbonate + 1 g of sulphur / 1600 °F / 1 h |
| dark brown-grey | 8795 | mineral : fluorine<br>rock : very pale yellow, translucid<br>powder : white (light yellow reflection)<br>origin : Ohio, United States<br><br>production process:<br>1 g of fluorine + 1 g of sodium carbonate / 1600 °F / 1 h |
| dark brown-grey | 8796 | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 15 g<br>powder : light grey<br>origin : East Broughton, Québec<br><br>production process:<br>(followed from «dark greyish brown», «orange-beige», «iron-grey darker than "dark iron-grey"», «marbled and mat grey» and «brown»)<br>4 g of galena powder deposited on a stick of steatite / 1500 °F / 1 h (glaze: «orange» on the steatite: «golden beige» at its surface and «dark iron-grey» in its depth) / irradiated with gamma rays at 424.7 Mrad / colour of the steatite in its depth |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown |

1672

| | | |
|---|---|---|
| | | mineral : zirconium silicate<br>powder : white<br>origin : Sial Company, Québec<br><br>production process:<br>(followed from «mat greyish brown [violet-pink tone]»)<br>1 g of goethite + 1 g of sodium carbonate + 2 g of sulphur + 1 g of zirconium silicate / 1600 °F / 1 h<br>(followed at «dark greyish chocolate-brown [accentuated violet-pink tone]», mat) |
| dark grey (light brown tone), mat | 8797 | |
| | | mineral : goethite[106]<br>powder : rusty orange<br>origin : Red Mill, in the suburbs of Cap-de-la-Madeleine, Québec<br><br>mineral : zirconium oxide<br>powder : light beige<br>origin : Tam Ceramic Inc., Québec<br><br>production process:<br>(followed from «dark violet-brown») |
| dark brown-grey | 8798 | 1 g of goethite + .50 g of zirconium oxide / 0↑2100 °F |
| ↓ | | (followed from «dark violet-brown») |
| dark brown-grey more grey | 8799 | 1 g of goethite + 1 g of zirconium oxide / 0↑2100 °F |
| ↓ | 8800 | (followed from «dark violet-brown») |
| dark brown-grey still more grey | | 1 g of goethite + 1.50 g of zirconium oxide / 0↑2100 °F |
| dark brown-grey | 8801 | production process:<br>1 g of goethite + 1 g of sodium carbonate + 1 g of zirconium oxide / 1700 °F / 1 h |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : zirconium oxide<br>powder : light beige<br>origin : Tam Ceramic Inc., Québec |

| | | |
|---|---|---|
| dark brown-grey<br>↓<br>dark brown-grey | 8802<br><br><br>8803 | <u>production process:</u><br>.50 g of goethite + .50 g of sulphur + .50 g of zirconium oxide / 1700 °F / 1 h<br><br>1 g of goethite + 1 g of sulphur + 1 g of zirconium / 1700 °F / 1 h |
| dark brown-grey | 8804 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br><u>production process:</u><br>(followed from «dark chocolate-brown [pink tone]»)<br>0↑1400 °F / slow cooling in furnace (indian red[107]): 1 g + 1 g of feldspar (dark reddish brown): .50 g + .50 g of sodium carbonate / 1700 °F / 1 h |
| dark brown-grey | 8805 | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br><u>production process:</u><br>0↑1400 °F / slow cooling in furnace (indian red[107]): 1.50 g + 1.50 g of feldspar (dark reddish brown): .50 g + .50 g of sulphur + .50 g of sodium carbonate + .50 g of titanium dioxide / 1600 °F / 1 h |
| | | mineral : halite[41]<br>rock : colourless<br>powder : colourless |

| | | |
|---|---|---|
| | | origin : Seleine Mine, Iles-de-la-Madeleine, Québec |
| | | **production process:** (followed from «amber-grey [or reddish brown tone]») rock irradiated with gamma rays at: |
| dark brown-grey | 8806 | 78.95 Mrad[1093] |
| dark brown-grey | 8807 | 85.59 Mrad[1094] |
| dark brown-grey | 8808 | 91.29 Mrad |
| dark brown-grey | 8809 | 96.15 Mrad |
| dark brown-grey | 8810 | 102.4 Mrad |
| dark brown-grey | 8811 | 107.55 Mrad |
| dark brown-grey | 8812 | 118.95 Mrad[1095] |
| dark brown-grey | 8813 | 124.65 Mrad |
| dark brown-grey | 8814 | 129.688 Mrad (followed at «greyish brown») |
| | | mineral : haematite<br>rock : medium chocolate-brown<br>powder : medium chocolate-brown<br>origin : Nouveau Québec, Québec |
| dark brown-grey or grey-brown | 8815 | **production process:** 4 g of haematite + 200 ml phosphoric acid / soaking: 4 years / drying on hot plate (still humid) / colour of the solid[1096] |
| dark brown-grey | 8816 | **production process:** (followed from «blackish russet brown») 2 g of haematite + 2 g of sodium carbonate / 0↑1800 °F + 1 h at 1800 °F (dark chocolate-brown [red tone]) / irradiated with gamma rays at 423.88 Mrad[239] |
| | | mineral : ilmenite<br>rock : blackish grey, with metallic luster<br>powder : blackish grey, with metallic luster<br>origin : Québec Fer et Titane Co., Havre Saint-Pierre, Québec |
| | | **production process:** (followed from «metallic grey darker than "black metallic grey"») rock irradiated with gamma rays at: |
| dark grey (accen- | 8817 | 102.4 Mrad |

1675

| | | |
|---|---|---|
| tuated brown tone)<br>↓<br>dark grey (still more accentuated brown tone) | 8818 | 122.984 Mrad<br><br>(followed at «blackish brown») |
| | | mineral : ochre[111]<br>powder : dark reddish brown<br>origin : Red Mill, in the suburbs of Cap-de-la -Madeleine, Québec<br><br>mineral : sulphur<br>rock : brilliant yellow<br>powder : brilliant yellow<br>origin : unknown<br><br>production process:<br>1 g of ochre + 2 g of potassium carbonate + 1 g of sulphur: |
| dark brown-grey<br>↓ | 8819 | 0↑1500 °F |
| dark brown-grey | 8820 | 0↑1600 °F<br>(followed at «dark iron-grey») |
| | | production process:<br>2 g of ochre + 6 g of potassium carbonate + 2 g of sulphur: |
| dark brown-grey<br>\| | 8821 | 0↑1500 °F |
| dark brown-grey<br>↓ | 8822 | 0↑1600 °F |
| dark brown-grey | 8823 | 0↑1700 °F<br>(followed at «dark iron-grey») |
| | | mineral : ochre[128]<br>powder : black<br>origin : Red Mill, in the suburbs of Cap-de-la -Madeleine, Québec<br><br>mineral : sulphur<br>rock : brilliant yellow<br>powder : brilliant yellow<br>origin : unknown<br><br>mineral : zirconium silicate<br>powder : white<br>origin : Sial Company, Québec<br><br>production process: |
| dark brown-grey | 8824 | 1 g of ochre + 1 g of sulphur + 1 g of zirconium silicate / 0↑700 °F<br>(followed at «dark greyish brown») |

| | | |
|---|---|---|
| profound dark brown-grey | 8825 | mineral : pyrolusite<br>rock : black (light brown tone), mat<br>powder : black (light brown tone), mat<br>origin : probably Nova Scotia<br><br>production process:<br>4 g of pyrolusite + 25 ml sulphuric acid / soaking: 24 h / drying on hot plate[1098] |
| dark brown-grey | 8826 | mineral : crystalline quartz<br>rock : colourless<br>origin : Ferme Adam, Bonsecours, Eastern Townships, Québec<br><br>mineral : sulphur<br>rock : brilliant yellow<br>powder : brilliant yellow<br>origin : unknown<br><br>production process:<br>1 g of quartz + 1 g of sulphur / 1700 °F / 1 h |
| dark brown-grey | 8827 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml hydrochloric acid / natural drying (very vivid orange-yellow) / 0↑1700 °F[1099] |
| dark brown-grey | 8827.1 | mineral : siderite<br>rock : caramel-brown (grey tone)<br>powder : light orange-beige<br>origin : De-Mix quarry, North side of Mont Saint-Hilaire, Rouville county, Québec<br><br>production process:<br>1 g of siderite + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : smaltite[25], variety of skutterudite<br>rock : dark iron-grey, with silver metallic brilliance |

1677

| | | |
|---|---|---|
| | | powder : dark grey<br>origin : Cobalt, Ontario<br><br>production process:<br>(followed from «grey much darker than "dark grey"»)<br>rock irradiated with gamma rays at: |
| brown-grey<br>↓ | 8828 | 201.6 Mrad |
| darker brown-grey<br>↓ | 8829 | 247.6 Mrad |
| still darker brown-grey<br>↓ | 8830 | 287.3 Mrad |
| dark brown-grey | 8831 | 360 Mrad[1100]<br>(followed at «blackish brown») |
| dark brown-grey [with «dark royal blue» particles ] | 8832 | production process:<br>1 g of smaltite + .50 g of sodium carbonate / 1800 °F / 1 h[1101]<br>(followed at «medium iron-grey») |
| dark grey (light brown tone) | 8833 | mineral : nickel sulphide<br>rock : dark grey<br>powder : dark grey<br>origin : Sudbury, Ontario<br><br>production process:<br>2000 °F / 30 min.[1102] |
| dark brown-grey | 8834 | mineral : vesuvianite<br>rock : lilac<br>powder : lilac<br>origin : John Mansville Mine, Asbestos, Québec<br><br>production process:<br>1 g of vesuvianite + 1 g of sodium carbonate / 1700 °F / 1 h |
| dark brown-grey | 8835 | mineral : yofortierite[87]<br>rock : dark chocolate-brown (with pinkish brown areas)<br>powder : dark chocolate-brown<br>origin : De-Mix quarry, North side of Mont Saint-Hilaire, Rouville county, Québec<br><br>production process:<br>(followed from «dark brown [accentuated brown tone]»)<br>2 g of yofortierite + 2 g of sodium carbonate / 0↑1500 °F + 1 h at 1500 °F (very dark brown, almost |

1678

| | | |
|---|---|---|
| | | black) / irradiated with gamma[239] rays at 424.7 Mrad |
| | | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>production process:<br>1 g of apatite + 1 cc of white transparent printing ink / mechanical grinding / 7 superimpositions on white glazed paper (dark grey) / irradiated with gamma rays at: |
| grey a bit darker and more brown than «dark brown-grey» | 8836 | 5.7 Mrad[1103] |
| ↓ | | |
| brown-grey identical to the previous one | 8837 | 11.4 Mrad |
| ↓ | | |
| brown-grey identical to the previous one | 8838 | 17.91 Mrad |
| ↓ | | |
| brown-grey a bit lighter | 8839 | 22.8 Mrad |
| | | mineral : sphalerite[27]<br>rock : dark grey, with golden yellow metallic brilliance<br>powder : dark brownish grey<br>origin : Matagami Mine, Matagami, Québec<br>production process:<br>(followed from «grey darker than "dark grey"»)<br>rock irradiated with gamma rays at: |
| grey (light brown tone) a bit darker than «dark brown-grey» | 8840 | 201.6 Mrad[1104] |
| ↓ | | |
| darker brown-grey | 8841 | 242.804 Mrad |
| ↓ | | |
| still darker brown-grey | 8842 | 287.3 Mrad |
| ↓ | | |
| still darker brown-grey | 8843 | 360 Mrad[1105] |

| | | |
|---|---|---|
| ↓<br>still darker<br>brown-grey | 8844 | 602.804 Mrad |
| | | mineral : anorthosite<br>rock : dark grey<br>powder : medium grey<br>origin : Jonquière, Lac Saint-Jean, Québec<br><br>production process:<br>(followed from «grey darker than "dark grey"»)<br>rock irradiated with gamma rays at: |
| brown-grey darker than «dark brown-grey» | 8845 | 57.4 Mrad[1106] |
| ↓<br>brown-grey still a bit darker | 8846 | 65.704 Mrad |
| ↓<br>brown-grey still darker | 8847 | 102.4 Mrad |
| ↓<br>much darker brown-grey | 8848 | 124.704 Mrad |
| ↓<br>still darker brown-grey | 8849 | 148.4 Mrad<br>(followed from «medium chocolate-brown») |
| | | mineral : chalcopyrite<br>rock : brass-yellow, with metallic luster<br>powder : dark grey (with golden particles)<br>origin : Noranda Mines, Noranda, Abitibi, Québec<br><br>production process: |
| brown-grey darker than «dark brown-grey» | 8850 | powder irradiated with gamma[228] rays at 124.704 Mrad[433,1107]<br>(followed at «blackish chocolate-brown») |
| | | mineral : chromite[294]<br>rock : dark grey<br>powder : dark grey<br>origin : Black Lake, Eastern Townships, Québec<br><br>production process:<br>rock irradiated with gamma[228] rays at: |
| brown-grey darker than «dark brown-grey» | 8851 | 5 Mrad |
| ↓<br>still darker brown-grey | 8852 | 10 Mrad |

| | | |
|---|---|---|
| still darker brown-grey | 8853 | 57.4 Mrad |
| darker brown-grey | 8854 | 63.984 Mrad |
| still darker brown-grey | 8855 | 102.4 Mrad |
| darker brown-grey | 8856 | 148.4 Mrad |
| still darker brown-grey | 8857 | 201.6 Mrad |
| darker brown-grey | 8858 | 242.804 Mrad |
| still darker brown-grey | 8859 | 247.6 Mrad |
| ↓ | | |
| darker brown-grey | 8860 | 287.3 Mrad<br>(followed at «brownish black») |
| | | <u>production process:</u><br>powder irradiated with gamma rays at: |
| brown-grey more accentuated and darker than «dark brown-grey» | 8861 | 64.7 Mrad |
| ↓ | | |
| brown-grey still darker and more accentuated | 8862 | 424.7 Mrad |
| | | mineral : graphite<br>rock : dark grey, with metallic brilliance<br>powder : dark grey, with metallic brilliance<br>origin : Grenville, Québec<br><br><u>production process:</u> |
| brown-grey darker than «dark brown-grey» | 8863 | 4 g of graphite + 20 ml nitric acid / soaking: 24 h / drying on hot plate[1108] |
| | | mineral : nickel<br>powder : dark brownish grey, with metallic brilliance<br><br><u>production process:</u><br>(followed from «dark brownish grey») |
| brown-grey darker than «dark brown- | 8864 | powder irradiated with gamma[239] rays at 424.7 Mrad |

1681

| | | |
|---|---|---|
| grey» [tends towards black] | | |
| | | mineral : nickeliferous pyrrhotite[23]<br>rock : dark iron-grey, with metallic luster<br>powder : dark iron-grey<br>origin : Inco Co., Sudbury, Ontario<br><br>production process:<br>(followed from «iron-grey a bit darker than "dark iron-grey"»)<br>rock irradiated with gamma rays at: |
| brown-grey darker than «dark brown-grey» | 8865 | 57.4 Mrad |
| | 8866 | 65.704 Mrad |
| ↓ | 8867 | 102.4 Mrad |
| darkens and | 8868 | 124.704 Mrad[1109] |
| ↓ | | |
| becomes more brown | 8869 | 148.4 Mrad<br>(followed at «medium chocolate-brown») |
| | | mineral : milky quartz<br>rock : milky white, translucid<br>origin : Ferme Adam, Bonsecours, Eastern Townships, Québec<br><br>production process:<br>1600 °F / 1 h (whiter white and more milky and opaque than «milky translucid white») / rock irradiated with gamma rays at: |
| very dark brown-grey ↓ | 8870 | 64.7 Mrad |
| brown-grey still darker | 8871 | 424.7 Mrad |
| | | mineral : graphite<br>rock : dark grey, with metallic brilliance<br>powder : dark grey, with metallic brilliance<br>origin : Grenville, Québec<br><br>production process: |
| brown-grey much darker than «dark brown-grey» | 8872 | 4 g of graphite + 20 ml hydrofluoric acid / soaking: 24 h / drying in drying oven at 100 °F[1110] |
| brown-grey much darker than «dark brown-grey» | 8873 | production process:<br>4 g of graphite + 20 ml hydrochloric acid / soaking: 24 h / drying on hot plate[1111] |

1682

| | | |
|---|---|---|
| | | mineral : sphalerite[27]<br>rock : dark grey, with golden yellow metallic brilliance<br>powder : dark brownish grey<br>origin : Matagami Mine, Matagami, Québec<br><br>production process:<br>powder irradiated with gamma[239] rays at: |
| brown-grey much darker than «dark brown-grey»<br>↓ | 8874 | 64.7 Mrad |
| brown-grey still darker [brown tone a bit more accentuated] | 8875 | 424.7 Mrad |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process: |
| brown-grey much darker than «dark brown grey» | 8876 | 2 g of powder finely grinded + 20 ml sulphuric acid / soaking: 3 d. / drying on hot plate |
| | | mineral : sardonyx<br>rock : white, slightly translucid (with a light orange-amber circular area on the surface)<br>powder : very light grey<br>origin : unknown<br><br>mineral : sulphur<br>rock : brilliant yellow<br>powder : brilliant yellow<br>origin : unknown<br><br>production process: |
| very dark brown-grey, almost black | 8877 | 1 g of sardonyx + 2 g of sodium carbonate + 1 g of sulphur / 1600 °F / 1 h |
| | | mineral : bloody agate<br>rock : dark grass-green, translucid<br>powder : light grey (light green tone) |

| | | |
|---|---|---|
| very dark brown-grey, almost black | 8878 | origin : India<br>production process:<br>(followed from «olive-green [brown tone]»)<br>8 g of agate + 40 ml hydrochloric acid / soaking: 1 wk. / separation of the liquid and the solid / natural drying (colour of the liquid: medium olive-green) / irradiated with gamma rays at 424.7 Mrad |
| very dark brown-grey or grey-brown [almost black] | 8879 | mineral : calcite (with clayey inclusions)<br>rock : very light creamy yellow, translucid<br>powder : white<br>origin : De-Mix quarry, near Saint-Philippe de Laprairie, Québec<br><br>production process:<br>(followed from «pinkish beige»)<br>0↑1600 °F + 15 h at 1600 °F (medium and accentuated beige [pinkish orange tone]): 2 g + 40 ml sulphuric acid / soaking: 20 d. / drying on hot plate (white) / irradiated with gamma rays at 424.7 Mrad |
| very dark brown-grey, almost black<br>↓ | 8880 | mineral : galena<br>rock : dark grey, with metallic brilliance<br>powder : dark grey, with metallic brilliance<br>origin : Trail, British Columbia<br><br>production process:<br>(followed from «metallic grey darker than "dark metallic grey"»)<br>powder irradiated with gamma rays at:<br>360 Mrad |
| brown-grey still darker | 8881 | 424.7 Mrad |
| very dark brown-grey, almost black | 8882 | mineral : halite[41]<br>rock : colourless<br>powder : colourless<br>origin : Seleine Mine, Iles-de-la-Madeleine, Québec<br><br>production process:<br>(followed from «violet-blue [crimson tone]»)<br>the sample of powder is irradiated during 7 days directly at the exit of the primary beam of an X ray generator [copper radiation, 20 mA current, 40 kV] (violet-blue [crimson tone]) and then irradiated with gamma rays at 360 Mrad |

| | | |
|---|---|---|
| | | mineral : magnetite<br>rock : dark grey, with metallic brilliance<br>powder : dark grey<br>origin : Fosse du Labrador, Québec<br><br>production process:<br>rock irradiated with gamma rays at: |
| dark grey | 8883 | 5 Mrad |
| ¦ | 8884 | 10 Mrad |
| ¦ | 8885 | 57.4 Mrad |
| which darkens | 8886 | 63.984 Mrad |
| and becomes more | 8887 | 102.4 Mrad |
| brown ¦ | 8888 | 122.984 Mrad |
| ¦ | 8889 | 148.4 Mrad |
| evolving towards | 8890 | 201.6 Mrad |
| ¦ | 8891 | 247.6 Mrad |
| ↓ | 8892 | 287.3 Mrad |
| very dark brown-grey, almost black | 8893 | 360 Mrad<br><br>(followed at «brownish black») |
| very dark brown-grey, almost black | 8894 | mineral : pyrolusite[101]<br>rock : black (light brown tone), mat<br>powder : black (light brown tone), mat<br>origin : probably Nova Scotia<br><br>production process:<br>4 g of pyrolusite + 25 ml hydrochloric acid / soaking: 24 h / drying on hot plate |
| very dark brown-grey, almost black | 8895 | mineral : fuel oil soot[86]<br>powder : profound brownish black<br>origin : boiler room of Laval University, city of Québec, Québec<br><br>production process:<br>2 g of soot + 20 ml hydrofluoric acid / soaking: 24 h / drying in drying oven at 100 °F[1112] |
| very dark grey, almost black (light brown tone) | 8896 | production process:<br>2 g of soot + 20 ml nitric acid / soaking: 24 h / drying on hot plate[1113] |
| | | mineral : vesuvianite<br>rock : lilac<br>powder : lilac<br>origin : John Mansville Mine, Asbestos, Québec<br><br>production process:<br>(followed from «grey a bit more pale than "dark |

| | | |
|---|---|---|
| very dark brown-grey, almost black | 8897 | brownish grey"») 1 g of vesuvianite + 1 g of sodium carbonate / 1700 °F / 1 h (dark brownish grey) / irradiated with gamma[228] rays at 425.65 Mrad |
| | | mineral : ilmenite<br>rock : blackish grey, with metallic luster<br>powder : blackish grey, with metallic luster<br>origin : Québec Fer et Titane Co., Havre Saint-Pierre, Québec<br><br>production process:<br>powder irradiated with gamma[239] rays at: |
| brown-grey a bit more pale than «blackish brown-grey»<br>↓ | 8898 | 64.7 Mrad |
| grey a bit more pale than «blackish brown-grey» | 8899 | 424.7 Mrad |
| | 8900 | mineral : sodalite, hackmanite variety, fluorescent and phosphorescent<br>cristals : very dark grey, almost black<br>origin : Poudrette quarry, Mont Saint-Hilaire, Québec<br><br>production process:<br>(followed from «blackish grey») |
| brown-grey a bit less dark than «blackish brown-grey» | 8901 | cristals irradiated with gamma rays at 424.7 Mrad |
| | | mineral : steatite<br>rock : light cold grey, slightly translucid; stick measuring 1/2" x 4 7/8" x 1/8" and weighing 15 g<br>powder : light grey<br>origin : East Broughton, Québec<br><br>production process:<br>(followed from «brownish grey [green tone]») |
| blackish brown-grey | 8902 | rock irradiated with gamma[239] rays at 604.5 Mrad |
| | | mineral : stibnite<br>rock : dark grey with silver and blue metallic brilliance<br>powder : dark grey<br>origin : Consolidated Durham Mine, Saint- |

| | | |
|---|---|---|
| blackish brown-grey | 8903 | Georges, New Brunswick<br><br>production process:<br>(followed from «metallic grey much darker than "dark metallic grey"»)<br>rock irradiated with gamma[228] rays at 602.804 Mrad[1114] |
| mixture of particles | | |
| brown-grey lighter «brown-grey» / cream | 8904 | mineral : haematite<br>rock : medium chocolate-brown<br>powder : medium chocolate-brown<br>origin : Nouveau Québec, Québec<br><br>production process:<br>(followed from «greyish brown darker than "greyish brown"»)<br>0↑1800 °F (dark violet-brown): 4 g + 100 ml sulphuric acid / soaking: 2 wk. / drying on hot plate (iron-grey) / irradiated with gamma rays at 424.7 Mrad |
| medium brown-grey / white | 8905 | mineral : mussel shell or calcium carbonate<br>shell : dark indigo-blue (violet tone)<br>powder : white<br>origin : bank of Saint-Lawrence river, Baie-des-Chaleurs, Gaspésie, Québec<br><br>mineral : sulphur<br>rock : brilliant yellow<br>powder : brilliant yellow<br>origin : unknown<br><br>production process:<br>2 g of mussel powder + 2 g of sulphur / 1300 °F / 1 h |
| medium brown-grey / medium iron-grey / white | 8906 | mineral : tremolite<br>rock : medium brown (evergreen tone)<br>powder : greyish beige<br>origin : Tetreault Mine, Montauban, Portneuf county, Québec<br><br>production process:<br>2 g of tremolite + 2 g of sodium carbonate / 0↑1000 °F + 1 h at 1000 °F (greyish brown or brownish grey) / irradiated with gamma[239] rays at 423.88 Mrad[262] |

1687

| | | |
|---|---|---|
| brown-grey (violet tone) | | |
| brown-grey (violet reflection) | 8907 | mineral : tiger-eye agate<br>rock : orange with silky luster, opaque<br>powder : orange with silky luster<br>origin : Africa<br><br>mineral : sulphur<br>rock : brilliant yellow<br>powder : brilliant yellow<br>origin : unknown<br><br><u>production process</u>:<br>1 g of agate + 1 g of sulphur / 1600 °F / 1 h |
| medium brown-grey (violet reflection) | 8908 | mineral : goethite[106]<br>powder : rusty orange<br>origin : Red Mill, in the suburbs of Cap-de-la-Madeleine, Québec<br><br>mineral : zirconium silicate<br>powder : white (very light yellow reflection)<br>origin : Sial Company, Québec<br><br><u>production process</u>:<br>(followed from «medium greyish brown [violet-pink tone]»)<br>1 g of goethite + 1 g of sodium carbonate + 2 g of zirconium silicate / 1600 °F / 1 h<br>(followed at «medium greyish brown [violet-red tone]») |
| medium brown-grey (violet reflection) | 8909 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><u>production process</u>:<br>(followed from «dark brownish orange»)<br>2 g of goethite + 1 g of sulphur + 1 g of titanium dioxide / 1500 °F / 1 h<br>(followed at «dark greyish chocolate-brown [light orange tone]» and «greyish beige [reddish orange tone]») |

| | | |
|---|---|---|
| medium brown-grey (violet reflection) | 8910 | production process:<br>(followed from «dark brown [violet-red tone]»)<br>2 g of goethite + 2 g of sulphur + 2 g of titanium dioxide / 1500 °F / 1 h |
| blackish grey (light violet-brown reflection) | 8911 | mineral : nickeliferous pyrrhotite[23]<br>rock : dark iron-grey, with silver and golden yellow metallic brilliance<br>powder : dark iron-grey<br>origin : Inco Co., Sudbury, Ontario<br>production process:<br>(followed from «iron-grey much darker than "dark iron-grey"»)<br>0↑1900 °F (dark iron-grey) / powder irradiated with gamma[239] rays at 424.7 Mrad |
| brown-grey (crimson tone) | | |
| brown-grey (light crimson tone) | 8912 | mineral : ochre[111]<br>powder : dark reddish brown<br>origin : Red Mill, in the suburbs of Cap-de-la-Madeleine, Québec<br><br>mineral : sulphur<br>rock : brilliant yellow<br>powder : brilliant yellow<br>origin : unknown<br>production process:<br>8 g of ochre + 8 g of sulphur + 8 g of potassium carbonate / 0↑1500 °F<br>(followed at «dark greyish brown [light crimson tone]») |
| dark brown-grey (very light crimson tone) | 8913 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br>production process:<br>(followed from «brown [crimson tone]»)<br>1 g of ochre + 2 g of halite / 0↑1750 °F |
| | | mineral : ochre[128]<br>powder : black |

| | | |
|---|---|---|
| dark brown-grey (light crimson tone) | 8914 | origin : Red Mill, in the suburbs of Cap-de-la -Madeleine, Québec<br><br>mineral : sulphur<br>rock : brilliant yellow<br>powder : brilliant yellow<br>origin : unknown<br>production process:<br>(followed from «brown [violet-red tone] darker than "brown [violet-red tone]"»)<br>8 g of ochre + 8 g of sulphur + 8 g of potassium carbonate / 0↑1750 °F |
| dark brown-grey (crimson reflection) | 8915 | mineral : fluorine<br>rock : white (pink reflection), translucid<br>powder : white (grey reflection)<br>origin : Saint-Lawrence Fluorspar Company, Saint-Lawrence, Newfoundland<br><br>mineral : cement[1138]<br>powder : white<br>production process:<br>5 g of rocks of various sizes + 13.74 g of cement + 6.50 cc of water / manual mixing / moulding / hardening / 0↑1000 °F / irradiated with gamma rays at 18.85 Mrad |
| brown-grey (blue tone) | | |
| brown-grey (blue reflection) darker than «light brown-grey (blue tone)» | 8916 | mineral : agate<br>rock : grey (with a light orange circular area on the surface), slightly translucid<br>powder : very light grey<br>origin : unknown<br>production process:<br>(followed from «very, very light bluish grey»)<br>the «grey translucid» center of the rock is irradiated with gamma rays at:<br>102.4 Mrad[1116] |
| brown-grey (blue reflection) still darker | 8917 | 148.4 Mrad |
| brown-grey (blue reflection) still | 8918 | 201.6 Mrad |

1690

| | | |
|---|---|---|
| darker ↓ brown-grey (blue reflection) still darker | 8919 | 287.3 Mrad (followed at «greyish brown darker than "light greyish brown"») |
| brown-grey (green tone) | | |
| brown-grey (accentuated green reflection) a bit darker than «very light brown-grey (green reflection)» | 8920 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>(followed from «beige»)<br>2 g of fluorine + 20 ml sulphuric acid / soaking: 3 d. / drying on hot plate (medium beige): .2 g + 50 cc of transparent polyester resin + 1% of catalyst / manual grinding / moulding / hardening (very light grey [light yellow reflection]) / irradiated with electrons at 305,082 rad[354] |
| brown-grey (light green tone) a bit darker and more brown than «light brown-grey (green tone)» | 8921 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>powder irradiated with gamma rays at:<br>5 Mrad |
| ↓ brown-grey (light green tone) a bit darker and more brown | 8922 | 57.4 Mrad[89] |
| ↓ brown-grey (light green tone) still a bit darker and more brown | 8923 | 65.704 Mrad[1117]<br><br>(followed at «brownish grey darker than "light brownish grey"») |
| | | mineral : steatite |

| | | |
|---|---|---|
| | | rock : light cold grey, slightly translucid; stick measuring 1/2" x 4 7/8" x 1/8" and weighing 15 g<br>powder : light grey<br>origin : East Broughton, Québec<br><br>production process:<br>rock irradiated with gamma[239,1118] rays at: |
| brown-grey (green tone) much darker than «light brown-grey (green tone)» | 8924 | 201.6 Mrad |
| ↓ | | |
| darker brown-grey (green tone) | 8925 | 244.53 Mrad[1119] |
| ↓ | | |
| equivalent brown-grey (green tone) | 8926 | 247.6 Mrad |
| ↓ | | |
| much darker brown-grey (green tone) | 8927 | 287.3 Mrad |
| ↓ | | |
| still darker brown-grey (green tone) | 8928 | 360 Mrad<br><br>(followed at «blackish brownish grey») |
| | | mineral : bornite<br>rock : reddish brown (with localized green and bluish green oxidation)<br>powder : reddish brown<br>origin : Lac Musset, Fosse du Labrador, Québec<br><br>production process:<br>(followed from «phtalo[217a]-green [beige tone] more accentuated and dark than "pale phtalo-green [beige tone]"») |
| brown-grey (light green reflection) | 8929 | 1500 °F / 1 h (medium reddish brown): 1 g + 40 ml hydrochloric acid / soaking: 14 d. / separation of the liquid and the solid / natural drying (colour of the liquid: «greenish blue pastel» crystals [on a «pale phtalo-green» layer of powder]) / irradiated with gamma rays at 425.65 Mrad |
| | | mineral : epidote<br>rock : green (light brown tone [olive-green type])<br>powder : grey (greenish brown tone)<br>origin : Deloro Road, Madoc, Ontario<br><br>production process: |
| grey (brown and | 8930 | 12 g of epidote + 40 ml phosphoric acid / |

| | | |
|---|---|---|
| green tones) | | soaking: 2 wk. / drying on hot plate (still humid) / colour of the solid[1120] |
| grey (light brown tone with a green or blue reflection) | 8931 | mineral : obsidian<br>rock : very dark smoky grey, almost black<br>powder : light grey<br>origin : Arkansas, United States<br><br>production process:<br>(followed from «grey a bit darker than "light grey"»)<br>powder irradiated with gamma rays at 424.7 Mrad |
| medium brown-grey (green reflection) | 8932 | mineral : bornite<br>rock : reddish brown (with localized green and bluish green oxidation)<br>powder : reddish brown<br>origin : Lac Musset, Fosse du Labrador, Québec<br><br>production process:<br>(followed from «green a bit lighter and more luminous than "light green"»)<br>2 g of bornite + 15 ml nitric acid + 10 ml hydrochloric acid / soaking: 6 d. / separation of the liquid and the solid / natural drying (colour of the solid[24]: mixture of particles: light green / accentuated green) / irradiated with gamma rays at 425.65 Mrad |
| medium brown-grey (accentuated green tone) | 8933 | mineral : chalcopyrite<br>powder : dark grey (light green tone)<br>origin : Centre de recherche des Mines Noranda in Montréal, Québec<br><br>production process:<br>powder irradiated with electrons at 302,831 rad[36] |
| medium brown-grey (localized green reflection) | 8934 | mineral : copper concentrate (Cu-FeS)<br>powder : medium chocolate-brown (grey tone)<br>origin : Centre de recherche des Mines Noranda in Montréal, Québec<br><br>production process:<br>4 g of concentrate + 50 ml sulphuric acid / soaking: 4 wk. / drying on hot plate (light grass-green) / irradiated with gamma rays at 424.7 Mrad[81] |

| | | |
|---|---|---|
| brown-grey (green reflection) darker than «medium grey (brown and green tones)» | 8935 | mineral : hornblende<br>rock : medium evergreen (light grey tone), with a vitreous brilliance<br>powder : medium cold grey (light green tone)<br>origin : Abitibi, Québec<br><br>production process:<br>(followed from «greenish grey»)<br>powder irradiated with gamma rays at 424.7 Mrad |
| dark brown-grey (green reflection) | 8936 | mineral : nickel sulphide<br>rock : dark grey<br>powder : dark grey<br>origin : Sudbury, Ontario<br><br>production process:<br>(followed from «brown»)<br>140 g of nickel sulphide + 100 ml nitric acid / soaking: 5 months / natural drying (colour of the solid: light green): .6 g + 50 cc of transparent polyester resin + 1% of catalyst / manual grinding / moulding / hardening (light brownish grey) / irradiated with electrons at 305,082 rad[354] |
| brown-grey (light green tone) darker than «dark grey (brown and green tones)» | 8937 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of powder finely grinded + 20 ml hydrochloric acid / soaking: 3 d. / drying on hot plate |
| dark brown-grey, almost black (accentuated green tone) | 8938 | mineral : fuel oil soot[86]<br>powder : profound brownish black<br>origin : boiler room of Laval University, city of Québec, Québec<br><br>production process:<br>2 g of soot + 20 ml sulphuric acid / soaking: 24 h / bubbles immediately as soon as soot is deposited in acid / immediately after the bubbling, separation of the liquid and the solid / drying on hot |

1694

| | | |
|---|---|---|
| | | plate / colour of the solid[1121,1122] |
| dark brown-grey, almost black (green tone) | 8939 | production process:<br>2 g of soot + 20 ml hydrochloric acid / soaking: 24 h / drying on hot plate[1123] |
| brown-grey (yellow tone) | | |
| brown-grey (yellow reflection) more intense than «light brown-grey (yellow tone)» | 8940 | mineral : fluorine<br>rock : very light yellow, translucid<br>powder : white (light yellow reflection)<br>origin : Saint-Lawrence Fluorspar Company, Saint-Lawrence, Newfoundland<br><br>production process:<br>(followed from «light beige»)<br>.2 g of fluorine + 50 cc of transparent polyester resin + 1% of catalyst / manual grinding / moulding / hardening (light brownish grey [light yellow reflection]) / irradiated with electrons at 305,082 rad[354] |
| brown-grey (accentuated yellow tone) more intense and a bit darker than «brown-grey (yellow tone)» | 8941 | mineral : fluorine<br>rock : light pink, translucid<br>powder : white (light pink reflection)<br>origin : Saint-Lawrence Fluorspar Company, Saint-Lawrence, Newfoundland<br><br>production process:<br>(followed from «light ivory»)<br>2 g of fluorine + 20 ml nitric acid / soaking: 3 d. / drying on hot plate (medium orange-pink): .2 g + 50 cc of transparent polyester resin + 1% of catalyst / manual grinding / moulding / hardening (grey [light yellow reflection]) / irradiated with electrons at 305,082 rad[354] |
| brown-grey (accentuated yellow reflection) a bit darker than «brown-grey (yellow reflection)» | 8942 | mineral : apatite<br>rock : medium brownish red<br>powder : light pinkish beige<br>origin : Ile Calumet, Pontiac county, Québec<br><br>production process:<br>(followed from «beige»)<br>3 g of apatite + 25 ml nitric acid / soaking: 3 d. / drying on hot plate (very light yellow): .3 g + 50 cc of transparent polyester resin + 1% of catalyst / manual grinding / moulding / hardening (light grey [light yellow reflection]) / irradiated with electrons at 305,082 rad[354] |

| brown-grey (green-yellow tone) | | |
|---|---|---|
| brown-grey (light green-yellow reflection) more intense and darker than «very pale brown-grey (green yellow reflection)» | 8943 | mineral : calcite[11]<br>powder : white<br>origin : Calcite du Nord Company, Saint-Eugène de Mistassini, Lac Saint-Jean, Québec<br><br>production process:<br>44 g of calcite + 100 ml phosphoric acid / soaking: 3 wk. / drying on hot plate [still humid] (very light grey): .3 g + 50 cc of transparent polyester resin + 1% of catalyst / manual grinding / moulding / hardening (very pale brownish grey) / irradiated with electrons at 305,082 rad[354] |
| brown-grey (light green-yellow reflection) darker than «light brown-grey (green-yellow reflection)» | 8944 | mineral : olivine<br>powder : colourless (green reflection)<br>origin : Mount Haven, United States<br><br>production process:<br>(followed from «beige»)<br>30 g of olivine + 100 ml sulphuric acid / soaking: 24 h / drying on hot plate (light cream [light orange tone]): .3 g + 50 cc of transparent polyester resin + 1% of catalyst / manual grinding / moulding / hardening (light grey [light yellow reflection]) / irradiated with electrons at 305,082 rad[354] |
| brown-grey (intense green-yellow reflection) darker [brown] than «light brown-grey (green-yellow reflection)» | 8945 | production process:<br>(followed from «very light brown»)<br>.3 g of olivine + 50 cc of transparent polyester resin + 1% of catalyst / manual grinding / moulding / hardening (light grey [greenish yellow tone]) / irradiated with electrons at 305,082 rad[354] |
| brown-grey (green-yellow reflection) more intense | 8946 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>(followed from «beige»)<br>powder finely grinded and heated 0↑1300 °F (yellow more accentuated than «light yellow»): .2 g + 50 cc of transparent polyester resin + 1% of catalyst |

| | | |
|---|---|---|
| and dark than «light brown-grey (green-yellow reflection)» | | / manual grinding / moulding / hardening (light grey [very light yellow reflection]) / irradiated with electrons at 305,082 rad[354] |
| brown-grey (orange tone) | | |
| medium brown-grey (orange reflection) | 8947 | mineral : crystalline quartz<br>rock : colourless<br>origin : Ferme Adam, Bonsecours, Eastern Townships, Québec<br><br><u>production process:</u><br>(followed from «very, very light smoky grey»)<br>rock hermetically wrapped in bread dough / 1600 °F / 1 h (transparent white) / irradiated with gamma rays at 424.7 Mrad |
| brown-grey (orange tone) darker than «medium brown-grey (orange tone)» | 8948 | mineral : olivine<br>powder : colourless (green reflection)<br>origin : Mount Haven, United States<br><br><u>production process:</u><br>.26 g of olivine + 50 cc of transparent polyester resin + 1% of catalyst / manual grinding / moulding / hardening (medium brownish grey) / irradiated with gamma rays at 11.4 Mrad |
| amber-grey [or red-brown tone] | | |
| | | mineral : halite[41]<br>rock : colourless<br>powder : colourless<br>origin : Seleine Mine, Iles-de-la-Madeleine, Québec<br><br><u>production process:</u><br>(followed from «brownish grey darker than "medium brownish grey"»)<br>rock irradiated with gamma rays at: |
| amber-grey | 8949 | 34.2 Mrad |
| amber-grey | 8950 | 39.9 Mrad[1124] |
| amber-grey | 8951 | 45.6 Mrad |
| amber-grey | 8952 | 51.3 Mrad[1125] |
| amber-grey | 8953 | 56.18 Mrad |
| amber-grey | 8954 | 57.4 Mrad |

| | | |
|---|---|---|
| amber-grey | 8955 | 61.88 Mrad[1126] |
| ↓ | | |
| amber-grey | 8956 | 65.704 Mrad |
| ↓ | | |
| amber-grey | 8957 | 67.55 Mrad |
| ↓ | | |
| amber-grey | 8958 | 73.25 Mrad[1126] (followed at «dark brownish grey») |
| | | production process: (followed from «brownish grey») powder filtered at 14 meshes and irradiated with gamma rays at: |
| amber-grey | 8959 | 34.2 Mrad |
| ↓ | | |
| amber-grey | 8960 | 39.9 Mrad |
| ↓ | | |
| amber-grey | 8961 | 45.6 Mrad |
| ↓ | | |
| amber-grey | 8962 | 51.3 Mrad |
| ↓ | | |
| amber-grey | 8963 | 56.18 Mrad |
| ↓ | | |
| amber-grey | 8964 | 61.88 Mrad |
| ↓ | | |
| amber-grey | 8965 | 67.55 Mrad (followed at «greyish brown») |
| | | production process: (followed from «brownish grey») powder filtered at 42 meshes and irradiated with gamma rays at: |
| amber-grey | 8966 | 34.2 Mrad |
| ↓ | | |
| amber-grey | 8967 | 39.9 Mrad |
| ↓ | | |
| amber-grey | 8968 | 45.6 Mrad |
| ↓ | | |
| amber-grey | 8969 | 51.3 Mrad |
| ↓ | | |
| amber-grey | 8970 | 56.18 Mrad |
| ↓ | | |
| amber-grey | 8971 | 61.88 Mrad |
| ↓ | | |
| amber-grey | 8972 | 67.55 Mrad (followed at «greyish brown) |
| | | production process: |
| grey (localized amber reflection) | 8973 | rock hermetically wrapped in bread dough / irradiated with gamma rays at 5.7 Mrad |

1698

| brown-grey (pink tone) | | |
|---|---|---|
| light brown-grey (pink tone) | 8974 | mineral : anorthosite<br>rock : light grey<br>powder : very, very light greyish beige<br>origin : rang Sainte-Germaine, Oka, Québec<br><br>mineral : sulphur<br>rock : brilliant yellow<br>powder : brilliant yellow<br>origin : unknown<br><br>production process:<br>1 g of anorthosite + 2 g of sodium carbonate + 1 g of sulphur / 1700 °F / 1 h |
| light brown-grey (pink tone) | 8975 | mineral : crystalline quartz<br>rock : colourless<br>origin : Ferme Adam, Bonsecours, Eastern Townships, Québec<br><br>production process:<br>rock irradiated with gamma rays at 5 Mrad[1127]<br>(followed at «greyish brown [yellow tone]») |
| grey (pink-brown tone) more brown than «light grey (pink-brown tone)» | 8976 | mineral : andulusite<br>rock : light brownish grey<br>powder : light grey<br>origin : Bimbowrie, South Australia<br><br>production process:<br>rock irradiated with gamma rays at:<br>65.704 Mrad[1128] |
| grey (pink-brown tone) a bit darker than «light grey (pink-brown tone)» | 8977 | 148.4 Mrad |
| much darker grey (pink-brown tone) | 8978 | 201.6 Mrad |
| grey (pink-brown tone) still much darker | 8979 | 244.53 Mrad |

1699

| | | |
|---|---|---|
| ↓<br>grey (pink-brown tone) still much darker | 8980 | 360 Mrad |
| ↓<br>grey (pink-brown tone) still much darker | 8981 | 604.53 Mrad |
| brown-grey (light pink tone) much darker than «light brown-grey (pink tone)» | 8982 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>(followed from «iron-grey [light pink tone] darker than "light iron-grey [light pink tone]"»)<br>1 g of ochre + 1 g of titanium dioxide / 0↑1300 °F<br><br>(followed at «beige-flesh [salmon tone]») |
| brown-grey (accentuated pink tone) | 8983 | production process:<br>(followed from «grey [light pink tone] darker than "light grey [light pink tone]"»)<br>2 g of ochre + 1 g of titanium dioxide / 0↑1300 °F<br>(followed at «medium pinkish brown») |
| medium brown-grey (pink reflection) | 8984 | mineral : quartz<br>rock : light pink, translucid<br>powder : very light grey<br>origin : unknown<br><br>production process:<br>(followed from «beige-pink [grey or blue reflection]»)<br>rock irradiated with electrons at 305,200 rad[73] |
| brown-grey (violet-pink tone) | | |
| | | mineral : goethite[106]<br>powder : rusty orange<br>origin : Red Mill, in the suburbs of Cap-de-la-Madeleine, Québec |

1700

| | | |
|---|---|---|
| | | mineral : sulphur<br>rock : brilliant yellow<br>powder : brilliant yellow<br>origin : unknown<br><br>mineral : zirconium silicate<br>powder : white (very light yellow reflection)<br>origin : Sial Company, Québec<br><br>production process: |
| brown-grey (light violet-pink reflection), darker than «medium brown-grey (light violet-pink reflection)» | 8985 | 2 g of goethite + 1 g of sulphur + 1 g of zirconium silicate / 1500 °F / 1 h |
| ↓ | | |
| brown-grey (light violet-pink reflection) [between the previous and the following] | 8986 | 1 g of goethite + 2 g of sulphur + 1 g of zirconium silicate / 1500 °F / 1 h[1129]<br><br>(followed at «medium brownish grey»)<br><br>(followed from «medium brownish grey») |
| ↓ | | |
| medium brown-grey (light violet-pink reflection) | 8987 | 2 g of goethite + 2 g of sulphur + 2 g of zirconium silicate / 1500 °F / 1 h |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>(followed from «greyish beige [reddish orange tone]» and «dark greyish chocolate-brown [light orange tone]») |
| medium brown-grey (deep purple-pink reflection) | 8988 | 1 g of goethite + 2 g of sulphur + 1 g of titanium dioxide / 1600 °F / 1 h[1130]<br><br>(followed from «dark brown [violet-red tone]») |
| ↓ | | |
| medium brown-grey | 8989 | 1 g of goethite + 1 g of sulphur + 2 g of titanium |

| | | |
|---|---|---|
| (deep purple-pink reflection) | | dioxide / 1600 °F / 1 h |
| medium brown-grey (deep purple-pink reflection) | 8990 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>mineral : feldspar<br>rock : white, opaque<br>powder : white<br>origin : Baraute, Abitibi, Québec<br><br>production process:<br>0↑1400 °F / slow cooling in furnace (indian red[107]): 1.50 g + 1.50 g of feldspar (dark reddish brown): .50 g + .50 g of sodium carbonate + .50 g of sulphur / 1600 °F / 1 h<br>(followed at «dark greyish brown» and «blackish brown») |
| brown-grey (red tone) | | |
| brown-grey (red tone with a silver metallic luster) darker than «dark brown-grey (red tone)» | 8991 | mineral : rutile<br>powder : dark brown (orange-red reflection)<br>origin : North Stradbroke Island, Queensland, Australia<br><br>production process:<br>(followed at «red [with golden metallic brilliance]»)<br>0↑2000 °F (dark red [with golden metallic brilliance] / powder irradiated with gamma[239] rays at 424.7 Mrad[1131] |
| blackish grey (red-brown tone) a bit darker than «blackish grey (red-brown tone)» | 8992 | mineral : chalcopyrite<br>powder : dark grey (light green tone)<br>origin : Centre de recherche des Mines Noranda in Montréal, Québec<br><br>production process:<br>1300 °F / 1 h (blackish grey) / powder irradiated with gamma[239] rays at 424.7 Mrad |

1702

| | | |
|---|---|---|
| | | mineral : chrysocolla<br>rock : light greenish turquoise<br>powder : very light greenish turquoise<br>origin : Mexico<br><br>mineral : sulphur<br>rock : brilliant yellow<br>powder : brilliant yellow<br>origin : unknown |
| blackish grey (light reddish brown tone) a bit darker than «blackish grey (reddish brown tone)» | 8993 | production process:<br>2 g of chrysocolla + 2 g of sulphur / 1300 °F / 1 h (blackish grey) / irradiated with gamma[239] rays at 424.7 Mrad[81] |

GREY

| colour obtained | number | mineral / production process |
|---|---|---|
| grey (lilac tone) | | |
| | | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process:</u><br>rock irradiated with gamma rays at: |
| lilac-grey a bit darker than «pale lilac-grey» | 8994 | 5 Mrad |
| ↓ | | |
| lilac-grey still a bit darker | 8995 | 10 Mrad |
| ↓ | | |
| lilac-grey a bit darker | 8996 | 57.4 Mrad<br>(followed at «dark violet») |
| | | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u> |
| very, very light lilac-grey | 8997 | 2 g of fluorine + 20 ml ether / natural drying (white [light lilac-grey reflection]) / irradiated with gamma rays at 18.85 Mrad |
| very, very light lilac-grey | 8998 | <u>production process:</u><br>2 g of fluorine + 20 ml ammonia / natural drying (white [light lilac-grey reflection]) / irradiated gamma rays at 18.85 Mrad |
| | | mineral : fluorine<br>rock : violet and white, translucid<br>powder : very light grey<br>origin : Saint-Lawrence Fluorspar Company, Saint-Lawrence, Newfoundland |

| | | |
|---|---|---|
| grey (lilac reflection) lighter than «very light lilac-grey» | 8999 | <u>production process:</u><br>powder irradiated with electrons at 302,831 rad[36] |
| light grey (light lilac tone) | 9000 | mineral : fluorine<br>rock : colourless<br>powder : colourless<br>origin : Ohio, United States<br><br><u>production process:</u><br>1 g of fluorine + 1 cc of synthetic white transparent enamel paint used for the car / manual grinding / application on a piece of steel sheet used for the car's body measuring 1" x 1" (light greyish cream) / irradiated with gamma rays at 5 Mrad (followed at «light beige [lilac tone]») |
| lilac-grey more accentuated than «light lilac-grey» | 9001 | mineral : amethyst<br>rock : violet, translucid<br>powder : light grey (lilac tone)<br>origin : Thunderbay, Ontario<br><br><u>production process:</u><br>powder irradiated with electrons at 162,431 rad<br><br>(followed at «medium brownish grey») |
| lilac-grey a bit darker than «light lilac-grey» | 9002 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>rock irradiated with gamma rays at 63.984 Mrad<br><br>(followed at «crimson-violet») |
| lilac-grey darker than «light lilac-grey» | 9003 | <u>production process:</u><br>powder irradiated with gamma rays at 5 Mrad (followed at «lilac-grey [brown tone]») |
| | | mineral : vesuvianite<br>rock : lilac<br>powder : lilac<br>origin : John Mansville Mine, Asbestos, Québec |

1705

| | | |
|---|---|---|
| lilac-grey<br>↓ which becomes more ↓<br>pale and the lilac tone diminishes | 9004<br>9005<br>9006<br>9007 | production process:<br>(followed from «lilac [accentuated grey tone]»)<br>0↑ 800 °F<br>0↑ 900 °F<br>0↑1000 °F<br>0↑1100 °F<br>(followed at «white [grey reflection]») |
| lilac-grey (pink tone) | | |
| very light grey (light pinkish lilac reflection) | 9008 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>powder irradiated with electrons at 302,831 rad[36] |
| grey (pronounced lilac tone, with pink reflection) | 9009 | mineral : uraninite<br>rock : medium chocolate-brown (red Bordeau tone)<br>powder : medium milky chocolate-brown<br>origin : Yellowknife, Canada<br><br>production process:<br>(followed from «brown»)<br>0↑1900 °F (medium orange-brown): .50 g + 100 ml nitric acid / soaking: 4 years / drying on hot plate[1132] |
| lilac-grey (brown tone) | | |
| lilac-grey a bit darker and more brown than «light | 9010 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>(followed from «lilac-grey darker than "light lilac-grey"»)<br>powder irradiated with gamma rays at:<br>10 Mrad |

1706

| | | |
|---|---|---|
| lilac-grey» | | |
| ↓ | | |
| lilac-grey still a bit darker and more brown | 9011 | 57.4 Mrad |
| ↓ | | |
| lilac-grey still a bit darker and more brown | 9012 | 65.704 Mrad |
| ↓ | | |
| lilac-grey still a bit darker and more brown | 9013 | 102.4 Mrad |
| ↓ | | |
| lilac-grey still a bit darker and more brown | 9014 | 148.4 Mrad<br>(followed at «light beige [pink reflection]») |
| violet-grey | | |
| violet-grey darker than «very, very light violet-grey» | 9015 | mineral : fluorine<br>rock : reddish violet, translucid<br>powder : very light grey<br>origin : Ohio, United States<br><br>mineral : sulphur<br>rock : brilliant yellow<br>powder : brilliant yellow<br>origin : unknown<br><br><u>production process:</u><br>1 g of fluorine + 1 g of sulphur / 1700 °F / 1 h (very, very light beige-grey) / irradiated with gamma rays at 65.65 Mrad<br>(followed at «brown-violet») |
| grey colder and more pure than «light violet-grey», [more accentuated violet tone] | 9016 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>powder irradiated with electrons at 302,831 rad[36] |
| | | mineral : amethyst<br>rock : violet, translucid<br>powder : light grey (lilac tone) |

| | | |
|---|---|---|
| violet-grey darker than «light violet-grey» ↓ still darker violet-grey | 9017<br>9018 | origin : Thunderbay, Ontario<br><br>production process:<br>powder irradiated with gamma rays at:<br>65.704 Mrad<br><br>244.53 Mrad<br>(followed at «medium orange-beige [grey tone]») |
| violet-grey | 9019 | mineral : amethyst<br>rock : light violet, translucid<br>origin : Lac Sairs, Témiscamingue, Québec<br><br>production process:<br>1600 °F / 1 h (chalk-white [grey reflection]) / rock irradiated with gamma rays at 65.65 Mrad<br>(followed at «light beige») |
| violet-grey | 9020 | mineral : fluorine<br>rock : colourless<br>powder : colourless<br>origin : Ohio, United States<br><br>production process:<br>(followed from «light beige [lilac tone]»)<br>1 g of fluorine + 1 cc of synthetic white transparent enamel paint used for the car / manual grinding / application on a piece of steel sheet used for the car's body measuring 1" x 1" (light greyish cream) / irradiated with gamma rays at 57.4 Mrad<br>(followed at «dark brown [violet reflection]») |
| violet-grey | 9021 | mineral : fluorine<br>rock : reddish violet, translucid<br>powder : very light grey<br>origin : Ohio, United States<br><br>mineral : sulphur<br>rock : brilliant yellow<br>powder : brilliant yellow<br>origin : unknown<br><br>production process:<br>1 g of fluorine + 2 g of sodium carbonate + 1 g of sulphur / 1700 °F / 1 h |
| | | mineral : quartz<br>rock : light pink, translucid |

1708

| | | |
|---|---|---|
| violet-grey | 9022 | powder : very light grey<br>origin : unknown<br><br><u>production process:</u><br>4 g of quartz + 40 ml sulphuric acid / soaking: 22 d. / drying on hot plate (white) / irradiated with gamma rays at 65.65 Mrad<br>(followed at «beige-grey») |
| | | mineral : erythrite<br>rock : accentuated pink (lilac tone)<br>powder : light pink (lilac tone)<br>origin : Guatemala<br><br><u>production process:</u><br>1 g of erythrite + 5 g of pyrex / manual grinding / heating: 5 °C per min. 0↑1245 °C + maintenance during 1 h / cooling: 5 °C per min. until ambient temperature is reached / the entity is done in ambient air (dark violet-blue [«apple-green» areas]) / irradiation with gamma rays at: |
| violet-grey [with olive-green watering]<br>↓ | 9022.1 | 7.41 Mrad |
| more accentuated violet-grey [with olive-green watering] | 9022.2 | 9.88 Mrad |
| violet-grey darker than «medium violet-grey» | 9023 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br><u>production process:</u><br>(followed from «chocolate-brown a bit darker than "medium chocolate-brown"»)<br>1 g of fluorine + 1 cc of synthetic white transparent enamel paint used for the car[94] / manual grinding / application on a piece of steel sheet used for the car's body measuring 1" x 1" (medium beige) / irradiated with gamma rays at 360 Mrad |
| | | mineral : chalcopyrite<br>rock : brass-yellow, with metallic luster<br>powder : dark grey (with golden particles)<br>origin : Noranda Mines, Noranda, Abitibi, |

| | | |
|---|---|---|
| dark violet-grey | 9024 | Québec<br><br>mineral : calcite[11]<br>powder : white<br>origin : Calcite du Nord Company, Saint-Eugène de Mistassini, Lac Saint-Jean, Québec<br><br>production process:<br>1 g of chalcopyrite + 1 g of calcite / 1000 °C / 1 h |
| dark grey (light violet tone) | 9025 | mineral : goethite[106]<br>powder : rusty orange<br>origin : Red Mill, in the suburbs of Cap-de-la-Madeleine, Québec<br><br>production process:<br>(followed from «indian red [violet tone]»)<br>0↑1400 °F / slow cooling in furnace (indian red)[107] / 1700 °F / 1 h<br>(followed at «iron-grey [light violet tone]») |
| violet-grey (crimson tone) | | |
| grey (light crimson-violet tone) more pale and colder than «violet-grey (crimson tone)» | 9026 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>powder irradiated with electrons at 302,831 rad[36] |
| grey (with pink areas which give it the appearance of a violet-grey [crimson tone]) | 9027 | mineral : cryolite<br>rock : white, crystalline and translucid<br>powder : white<br>origin : Ivigtut, Groenland<br><br>production process:<br>0↑1600 °F (white [with yellowish areas]) / powder irradiated with gamma rays at 64.7 Mrad<br>(followed at «medium beige [with orange areas]») |

| | | |
|---|---|---|
| violet-grey (red tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «dark caput-mortuum [accentuated crimson-violet tone]») |
| dark grey (reddish violet tone) | 9028 | 0↑1400 °F / slow cooling in furnace (indian red[107]): 8 g + 96 g of sulphur / 1500 °F / 1 h (dark violet-brown): .50 g + .50 g of sulphur / 1700 °F / 1 h |
| grey (blue tone) | | |
| | | mineral : dolomite<br>rock : white (localized yellow reflection), crystalline and translucid<br>powder : white<br>origin : Bristol district, Pontiac county, Québec<br>production process:<br>(followed from «greyish blue tint»)<br>rock irradiated with gamma rays at: |
| 2 areas: blue-grey tint / brown-grey tint<br>↓ | 9029 | 148.4 Mrad |
| 2 areas: blue-grey tint and brown-grey tint which become much more accentuated<br>↓ | 9030 | 201.6 Mrad |
| 2 areas: blue-grey tint and brown-grey tint which still become more accentuated<br>↓ | 9031 | 244.53 Mrad |
| 2 areas: blue-grey tint and brown-grey tint equivalent to the previous tints | 9032 | 247.6 Mrad[1133]<br><br>(followed at «light beige [bluish grey tone]») |

1711

| | | |
|---|---|---|
| | | mineral : sardonyx<br>rock : white, slightly translucid (with a light orange-amber circular area on the surface)<br>powder : very light grey<br>origin : unknown<br><br><u>production process:</u><br>(followed from «very, very light grey»)<br>rock irradiated with gamma rays at: |
| very, very light grey (blue reflection)<br>↓ | 9033 | 57.4 Mrad |
| darker grey (blue tone)<br>↓ | 9034 | 64.7 Mrad |
| much darker grey (blue reflection) | 9035 | 102.4 Mrad<br>(followed at «brownish grey darker than "brownish grey tint"») |
| | | mineral : agate<br>rock : grey (with a light orange circular area on the surface), slightly translucid<br>powder : very light grey<br>origin : unknown<br><br><u>production process:</u> |
| very, very light blue-grey | 9036 | 1500 °F / 1 h (chalk-white) / rock irradiated with electrons at 305,200 rad** |
| | | <u>production process:</u><br>the «grey translucid» center of the rock is irradiated with gamma rays at: |
| very, very light grey (blue reflection)<br>↓ | 9037 | 5 Mrad |
| darker grey (blue reflection)<br>↓ | 9038 | 10 Mrad |
| still darker grey (blue reflection) | 9039 | 57.4 Mrad<br>(followed at «brown-grey [blue reflection]») |
| | | mineral : beryl<br>rock : light blue (near turquoise), slightly translucid<br>powder : light grey<br>origin : Lacorne district, Abitibi, Québec |

| | | |
|---|---|---|
| very, very light blue-grey | 9040 | <u>production process:</u><br>1600 °F / 1 h (very light bluish grey) / rock irradiated with electrons at 302,831 rad[45] |
| very, very light blue-grey | 9041 | mineral : beryl<br>rock : very light yellowish green, slightly translucid<br>powder : white (green reflection)<br>origin : Lacorne district, Abitibi, Québec<br><br><u>production process:</u><br>1600 °F / 1 h[133] |
| very light grey (light blue reflection)<br>↓ | 9042 | mineral : blue lace agate<br>rock : light blue (violet tone), slightly translucid<br>powder : very light grey<br>origin : Africa<br><br><u>production process:</u><br>rock irradiated with gamma rays at:<br>5 Mrad |
| grey a bit darker (very, very light blue reflection)<br>↓ | 9043 | 10 Mrad |
| still darker grey (blue reflection) | 9044 | 57.4 Mrad<br>(followed at «light grey [green reflection]») |
| very light blue-grey | 9045 | mineral : beryl<br>rock : light blue (near turquoise), slightly translucid<br>powder : light grey<br>origin : Lacorne district, Abitibi, Québec<br><br><u>production process:</u><br>1600 °F / 1 h[133] |
| blue-grey more | 9046 | mineral : crocidolite<br>rock : dark greyish blue<br>powder : pale greyish blue<br>origin : Griqualand district, South Africa<br><br><u>production process:</u><br>2 g of crocidolite + 2 g of sodium carbonate |

| | | |
|---|---|---|
| pale than «light blue-grey» | | (light bluish grey) / irradiated with gamma rays at 190.22 Mrad<br>(followed at «bluish grey [green reflection]») |
| light blue-grey | 9047 | <u>production process:</u><br>2 g of crocidolite + 2 g of sodium carbonate / grinding |
| | | mineral : Gaspé agate<br>rock : marbled nodule with shaded tints of white, pink and light grey, slightly translucid<br>powder : very light pinkish grey<br>origin : Mont Lyall, Gaspésie, Québec |
| light blue-grey | 9048 | <u>production process:</u><br>rock hermetically wrapped in bread dough / 1500 °F / 1 h |
| | | mineral : halite[41]<br>rock : colourless<br>powder : colourless<br>origin : Seleine Mine, Iles-de-la-Madeleine, Québec |
| | | <u>production process:</u><br>rock irradiated with electrons at: |
| light grey (light blue tone) | 9049 | 105,082 rad |
| ¦ | | |
| light grey (light blue tone) | 9050 | 140,400 rad |
| ¦ | | |
| light grey (light blue tone) | 9051 | 162,431 rad |
| ↓ | | |
| light grey (light blue tone) | 9052 | 164,800 rad<br>(followed at «light lemon-yellow») |
| | | mineral : crocidolite<br>rock : dark greyish blue<br>powder : pale greyish blue<br>origin : Griqualand district, South Africa |
| blue-grey more accentuated than «light blue-grey» | 9053 | <u>production process:</u><br>2 g of crocidolite + 2 g of sodium carbonate (light bluish grey) / irradiated with electrons at 302,831 rad[36] |
| | | mineral : sodalite<br>rock : light cold blue<br>powder : light grey (light blue tone)<br>origin : Bancroft, Ontario |

1714

| | | |
|---|---|---|
| light grey (light blue tone), a bit darker than «light grey (light blue tone)» ↓ | 9054 | <u>production process:</u> powder irradiated with electrons at: 162,431 rad |
| grey a bit colder and more light (blue tone a bit more accentuated) | 9055 | 302,831 rad[45] |
| blue-grey darker than «light blue-grey» | 9056 | mineral : Gaspé agate<br>rock : marbled nodule with shaded tints of white, pink and light grey, slightly translucid<br>powder : very light pinkish grey<br>origin : Mont Lyall, Gaspésie, Québec<br><br><u>production process:</u><br>rock hermetically wrapped in bread dough / 1500 °F / 1 h (light bluish grey) / irradiated with gamma rays at 64.7 Mrad<br>(followed at «2 areas: bluish grey ranging from "light" to "dark bluish grey" / dark iron-grey») |
| grey (light blue tone) ↓ | 9057 | mineral : copper<br>rock : reddish brown, with metallic luster<br>powder : reddish brown, with metallic luster<br>origin : inconnue<br><br><u>production process:</u><br>(followed from «greenish turquoise [light grey tone]»)<br>100 g of copper + 100 ml hydrochloric acid / soaking: 5 months / drying on hot plate (fairly pronounced greenish turquoise):<br>0↑450 °F |
| grey (light blue tone) | 9058 | 0↑500 °F<br>(followed at «grey») |
| blue-grey | 9059 | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>rock irradiated with electrons at 302,831 rad[36] |

1715

| | | |
|---|---|---|
| | | mineral : fluorine<br>rock : very light fluor-green (cold mint-green type), translucid<br>powder : very light grey<br>origin : Rogers Mine, Madoc, Ontario<br><br>production process:<br>1 g of fluorine + 1 cc of synthetic white transparent enamel paint used for the car / manual grinding / application on a piece of steel sheet used for the car's body measuring 1" x 1" (light yellowish beige) / irradiated with gamma rays at: |
| blue-grey | 9060 | 3.77 Mrad |
| ↓ | | (followed at «greyish green»)<br><br>(followed from «medium iron-grey [very light blue reflection]») |
| more intense blue-grey | 9061 | 57.4 Mrad<br>(followed at «medium chocolate-brown») |
| | | mineral : halite[41]<br>rock : colourless<br>powder : colourless<br>origin : Seleine Mine, Iles-de-la-Madeleine, Québec<br><br>production process: |
| blue-grey | 9062 | powder irradiated with neutrons at $10^{12}$ neutrons / $cm^2$ / sec. during 2,000 seconds[1135]<br>(followed at «fairly vivid medium burnt orange») |
| | | mineral : orthoclase<br>rock : light pinkish beige<br>powder : very light beige<br>origin : mine near Buckingham, Papineau county, Québec<br><br>production process:<br>(followed from «brownish grey»)<br>2 g of orthoclase + 2 g of sodium carbonate: |
| grey (light blue tone) ↓ | 9063 | 0↑1500 °F + 1 h at 1500 °F |
| grey (light blue tone) | 9064 | 0↑1600 °F + 1 h at 1600 °F<br>(followed at «intense greenish blue») |
| | | mineral : Gaspé agate<br>rock : marbled nodule with shaded tints of white, pink and light grey, slightly translucid |

| | | |
|---|---|---|
| 2 areas: blue-grey going from «light blue-grey» to «dark blue-grey» / dark iron-grey | 9065 | powder : very light pinkish grey<br>origin : Mont Lyall, Gaspésie, Québec<br><br>production process:<br>(followed from «bluish grey darker than "light bluish grey"»)<br>rock hermetically wrapped in bread dough / 1500 °F / 1 h (light bluish grey) / irradiated with gamma rays at 424.7 Mrad |
| dark grey (light blue tone) | 9066 | mineral : fluorine<br>rock : very light fluor-green (cold mint-green type), translucid<br>powder : very light grey<br>origin : Rogers Mine, Madoc, Ontario<br><br>production process:<br>(followed from «medium chocolate-brown»)<br>1 g of fluorine + 1 cc of synthetic white transparent enamel paint used for the car / manual grinding / application on a piece of steel sheet used for the car's body measuring 1" x 1" (light yellowish beige) / irradiated with gamma rays at 360 Mrad |
| mixture of particles | | |
| blue-grey reflection / beige reflection | 9067 | mineral : halite[41]<br>rock : colourless<br>powder : colourless<br>origin : Seleine Mine, Iles-de-la-Madeleine, Québec<br>production process:<br>granules irradiated with gamma rays at:<br>.1 Mrad[1136] |
| ↓<br>blue-grey tint / beige tint | 9068 | .6 Mrad[1136]<br>(followed at «mixture of particles: iron-grey [fairly pronounced blue tone] / fairly pronounced brown») |
| dark blue-grey or grey-blue / dark rusty brown / | 9069 | mineral : hypersthene<br>rock : black<br>powder : medium brownish grey<br>origin : Lac Saint-Jean, Québec<br>production process:<br>2 g of hypersthene + 2 g of sodium carbonate / 0↑1500 °F + 1 h at 1500 °F (orange [light brown tone]) / irradiated with gamma rays at 63.88 Mrad |

1717

| | | |
|---|---|---|
| white | | Mrad<br>(followed at «mixture of particles: dark iron-grey / white») |
| blue-grey (green tone) | | |
| blue-grey (green reflection) darker than «light blue-grey (green reflection)» | 9070 | mineral : crocidolite<br>rock : dark greyish blue<br>powder : pale greyish blue<br>origin : Griqualand district, South Africa<br><br><u>production process:</u><br>(followed from «bluish grey»)<br>2 g of crocidolite + 2 g of sodium carbonate (light bluish grey) / irradiated with gamma rays at 550.22 Mrad |
| grey (green tone) | | |
| grey (light green tone) a bit darker than «very pale green-grey» | 9071 | mineral : peridotite<br>rock : medium grey<br>powder : medium brownish grey (green reflection)<br>origin : Thetford Mines, Québec<br><br><u>production process:</u><br>1 g of peridotite + 1 cc of synthetic white transparent enamel paint used for the car / manual grinding / application on a piece of steel sheet used for the car's body measuring 1" x 1" (very pale greenish grey) / irradiated with gamma rays at 5 Mrad<br>(followed at «grey more intense than "very pale grey"») |
| grey (pronounced green tone), more accentuated than «pale green-grey» | 9072 | mineral : nickel sulphide<br>rock : dark grey<br>powder : dark grey<br>origin : Sudbury, Ontario<br><br><u>production process:</u><br>(followed from «beige darker than "pale beige"»)<br>140 g of nickel sulphide + 100 ml nitric acid / soaking: 5 months / natural drying (colour of the liquid: intense mint-green[299]): .3 g + 50 cc of transparent polyester resin + 1% of catalyst / manual grinding / moulding / hardening (pale and cold greenish grey) / irradiated with electrons at 305,082 rad[354] |
| | | mineral : dolomite<br>rock : light grey<br>powder : light grey |

| | | |
|---|---|---|
| very, very light grey, almost white (light green tone) | 9073 | origin : Shefferville, Ungava, Québec<br><br><u>production process:</u><br>2 g of dolomite + 2 g of sodium carbonate / 0↑1400 °F + 1 h at 1400 °F (followed at «mixture of particles: light green / beige») |
| very, very light grey (very light green reflection) | 9074 | mineral : fluorine<br>rock : very light fluor-green (cold mint-green type), translucid<br>powder : very light grey<br>origin : Rogers Mine, Madoc, Ontario<br><br><u>production process:</u><br>1500 °F / 1 h (semiopaque white [orange-pink reflection]) / rock irradiated with electrons at 305,200 rad[73] |
| very, very light green-grey | 9075 | mineral : orthoclase<br>rock : white (grey reflection)<br>powder : white (grey reflection)<br>origin : mine near Buckingham, Papineau county, Québec<br><br><u>production process:</u><br>(followed from «light beige»)<br>.3 g of orthoclase + 50 cc of transparent polyester resin + 1% of catalyst / manual grinding / moulding / hardening (white) / irradiated with electrons at 305,082 rad[354] |
| grey (green reflection) a bit more intense than «very, very light green-grey» | 9076 | mineral : orthoclase<br>rock : light pinkish beige<br>powder : very light beige<br>origin : mine near Buckingham, Papineau county, Québec<br><br><u>production process:</u><br>(followed from «light greyish beige or light beige-grey»)<br>2 g of orthoclase + 20 ml nitric acid / soaking: 3 d. / drying on hot plate (very light chamois): .3 g + 50 cc of transparent polyester resin + 1% of catalyst / manual grinding / moulding / hardening (very, very light grey) / irradiated with electrons at 305,082 rad[354] |
| | | mineral : calcite<br>rock : light pink<br>powder : pinkish white<br>origin : Huddersfield district, Pontiac county, Québec |

1719

| | | |
|---|---|---|
| green-grey more intense and darker than «very, very light green-grey» | 9077 | <u>production process:</u><br>(followed from «light greyish brown»)<br>.3 g of calcite + 50 cc of transparent polyester resin + 1% of catalyst / manual grinding / moulding / hardening (very, very light grey) / irradiated with electrons at 305,082 rad[354] |
| green-grey more intense and darker than «very, very light green-grey» | 9078 | mineral : orthoclase<br>rock : white (grey reflection)<br>powder : white (grey reflection)<br>origin : mine near Buckingham, Papineau county, Québec<br><br><u>production process:</u><br>(followed from «light beige»)<br>2 g of orthoclase + 20 ml hydrochloric acid / soaking: 3 d. / drying on hot plate (white [light yellow reflection]): .3 g + 50 cc of transparent polyester resin + 1% of catalyst / manual grinding / moulding / hardening (very, very light greenish grey) / irradiated with electrons at 305,082 rad[354] |
| grey (pronounced green tone) a bit darker than «very, very light green-grey» | 9079 | mineral : beryl<br>rock : light blue, slightly translucid<br>powder : light grey<br>origin : Abitibi, Québec<br><br><u>production process:</u><br>(followed from «light beige»)<br>2 g of beryl + 25 ml nitric acid / soaking: 24 h / drying on hot plate (light blue [light green or yellow tone]): .3 g + 50 cc of transparent polyester resin + 1% of catalyst / manual grinding / moulding / hardening (very light yellow or green) / irradiated with electrons at 305,082 rad[354] |
| grey (light green reflection) darker than «very, very light green-grey» | 9080 | mineral : apatite<br>rock : light grass-green (light blue and yellow tones), very slightly translucid<br>powder : very light grey (light green tone)<br>origin : region of Buckingham, Québec<br><br><u>production process:</u><br>(followed from «light grey»)<br>.2 g of apatite + 50 cc of transparent polyester resin + 1% of catalyst / manual grinding / moulding / hardening (very, very light grey [very light green reflection]) / irradiated with electrons at 305,082 rad[354] |

1720

| | | |
|---|---|---|
| very light and localized green-grey | 9081 | mineral : asbestos[4]<br>rock : dark grey (green reflection)<br>powder : light grey (green reflection)<br>origin : Asbestos Corporation Ltd., Thetford Mines, Québec<br><br>mineral : cement[1138]<br>powder : white<br><br>production process:<br>(followed from «very, very light beige»)<br>250 g of asbestos + 1650 ml hydrochloric acid in a 2000 ml becher or asbestos entirely covered with hydrochloric acid in a vertical container / soaking: 1 wk. / drying on hot plate (formation of 3 superimposed layers of colours, the one at the bottom being «apple-green»): 3 g + 27.40 g of cement + 13 cc of water / manual grinding / moulding / hardening / 0↑1900 °F<br>(followed at «localized very light mint-green [light grey tone]») |
| very light grey (green reflection) | 9082 | mineral : apatite<br>rock : medium brownish red<br>powder : light pinkish beige<br>origin : Ile Calumet, Pontiac county, Québec<br><br>production process:<br>2 g of apatite + 2 g of sodium carbonate / 0↑1900 °F + 1 h at 1900 °F (mixture of particles: light green / beige) / irradiated with electrons at 162,431 rad<br>(followed at «light greenish grey») |
| very light green-grey | 9083 | mineral : beryl<br>rock : light blue, slightly translucid<br>powder : light grey<br>origin : Abitibi, Québec<br><br>production process:<br>2 g of beryl + 25 ml hydrochloric acid / soaking: 24 h / drying on hot plate (light yellowish green): .3 g + 50 cc of transparent polyester resin + 1% of catalyst / manual grinding / moulding / hardening (light and cold mint-green) / irradiated with electrons at 155,082 rad<br>(followed at «mint-green») |
| | | mineral : almandite<br>rock : dark brownish red<br>powder : medium brownish red |

| | | |
|---|---|---|
| very light grey (light green tone) | 9084 | origin : Gore Mountain, Warren county, state of New York, United States<br><br>production process:<br>0↑1900 °F (dark iron-grey): .50 g + 50 ml sulphuric acid / soaking: 2 wk. / drying on hot plate |
| grey (light green reflection) more intense than «very light green-grey» | 9085 | mineral : serpentine<br>rock : yellowish green<br>powder : light greenish yellow<br>origin : probably Thetford Mines, Eastern Townships, Québec<br><br>production process:<br>(followed from «very light greyish beige or beige-grey»)<br>3 g of serpentine + 20 ml hydrofluoric acid / soaking: 24 h / drying in drying oven at 100 °F (very, very light yellowish beige): .3 g + 50 cc of transparent polyester resin + 1% of catalyst / manual grinding / moulding / hardening (very light cold grey) / irradiated with electrons at 305,082 rad[354] |
| grey (pronounced green tone) more accentuated than «very light green-grey» | 9086 | mineral : fluorine<br>rock : violet and white, translucid<br>powder : very light grey<br>origin : Saint-Lawrence Fluorspar Company, Saint-Lawrence, Newfoundland<br><br>production process:<br>(followed from «very light brown»)<br>2 g of fluorine + 20 ml nitric acid / soaking: 3 d. / drying on hot plate (orange): .2 g + 50 cc of transparent polyester resin + 1% of catalyst / manual grinding / moulding / hardening (very light grey [light yellow reflection]) / irradiated with electrons at 305,082 rad[354] |
| grey (light green tone) very, very slightly darker than «very light | 9087 | mineral : apatite<br>rock : light grass-green (light blue and yellow tones), very slightly translucid<br>powder : very light grey (light green tone)<br>origin : region of Buckingham, Québec<br><br>production process:<br>powder irradiated with electrons at 302,831 rad[36] |

| | | |
|---|---|---|
| green-grey» | | |
| light grey (light green tone) a bit more pale than «light green-grey» | 9088 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>production process:<br>powder irradiated with electrons at 302,831 rad[36] |
| light grey (green reflection) | 9089 | mineral : blue lace agate<br>rock : light blue (violet tone), slightly translucid<br>powder : very light grey<br>origin : Africa<br><br>production process:<br>(followed from «grey [blue reflection] darker than "very light grey [light blue reflection]"»)<br>rock irradiated with gamma rays at 64.7 Mrad[1137]<br>(followed at «brownish grey») |
| light grey (localized green reflection) | 9090 | mineral : apatite<br>rock : medium brownish red<br>powder : light pinkish beige<br>origin : Ile Calumet, Pontiac county, Québec<br><br>production process:<br>(followed from «very light greenish grey»)<br>2 g of apatite + 2 g of sodium carbonate / 0↑1900 °F + 1 h at 1900 °F (mixture of particles: light green / beige) / irradiated with electrons at 302,831 rad[45] |
| | | mineral : chromite[294]<br>rock : dark grey<br>powder : dark grey<br>origin : Black Lake, Eastern Townships, Québec<br><br>mineral : calcite[11]<br>powder : white<br>origin : Calcite du Nord Company, Saint-Eugène de Mistassini, Lac Saint-Jean, Québec |

1723

| | | |
|---|---|---|
| light green-grey | 9091 | production process:<br>(followed from «light grey»)<br>1.50 g of calcite + .50 g of chromite / 900 °C / 2h<br>(followed at «light grass-green») |
| light grey (light green tone) | 9092 | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec<br><br>production process:<br>(followed from «grey lighter than "light grey"»)<br>1.50 g of cement + .50 g of chromite / 900 °C / 2 h<br>(followed at «grass-green» and «medium mossy grass-green») |
| light green-grey | 9093 | mineral : chromite[294]<br>rock : dark grey<br>powder : dark grey<br>origin : Black Lake, Eastern Townships, Québec<br><br>mineral : cement[269]<br>powder : medium brownish grey<br>origin : CALCO, Charlesbourg, Québec<br><br>production process:<br>(followed from «grey lighter than "light grey"»)<br>1.50 g of cement + .50 g of chromite / 900 °C / 2 h[320,321]<br>(followed at «grass-green») |
| | | mineral : olivine<br>powder : colourless (green reflection)<br>origin : Mount Haven, United States<br><br>production process:<br>powder irradiated with gamma rays at: |
| green reflection \| becomes | 9094 | 5 Mrad |
| darker and more accentuated | 9095 | 10 Mrad |
| \| | 9096 | 57.4 Mrad |
| \| | 9097 | 102.4 Mrad |
| until it reaches \| | 9098 | 148.4 Mrad |

1724

| | | |
|---|---|---|
| ↓<br>light green-grey | 9099 | 190.22 Mrad<br>(followed at «light greenish grey [beige tone]») |
| grey (pronounced green reflection) much more intense than «light green-grey» | 9100 | mineral : fluorine<br>rock : pinkish lilac, opaque<br>powder : very light grey (lilac tone), almost white<br>origin : Saint-Lawrence Fluorspar Company, Saint-Lawrence, Newfoundland<br><br>production process:<br>(followed from «beige»)<br>.2 g of fluorine + 50 cc of transparent polyester resin + 1% of catalyst / manual grinding / moulding / hardening (light grey [light yellow reflection]) / irradiated with electrons at 305,082 rad[354] |
| green-grey a bit darker and more accentuated than «light green-grey» | 9101 | mineral : actinolite<br>rock : light and cold evergreen<br>powder : light grey (light green tone)<br>origin : erratic block found at Saint-Philémon near Dorchester, Québec<br><br>production process:<br>powder irradiated with electrons at 302,831 rad[36] |
| grey (light green tone) darker than «light green-grey» | 9102 | mineral : diopside<br>rock : light grey<br>powder : light beige<br>origin : Mont Orford, Québec<br><br>production process:<br>rock hermetically wrapped in bread dough / irradiated with gamma rays at 5.7 Mrad |
| grey (light green reflection) darker than «light green -grey» | 9103 | mineral : steatite<br>rock : light evergreen<br>powder : white<br>origin : East Broughton, Québec<br><br>production process:<br>(followed from «grey [light brown tone]»)<br>2 g of steatite + 20 ml hydrofluoric acid / soaking: 24 h / drying in drying oven at 100 °F (white): .3 g + 50 cc of transparent polyester resin + 1% of catalyst / manual grinding / moulding / hardening (light grey [light brown tone]) / ir- |

1725

| | | |
|---|---|---|
| | | radiated with electrons at 305,082 rad[354] |
| green-grey | 9104 | mineral : crocidolite<br>rock : dark greyish blue<br>powder : pale greyish blue<br>origin : Griqualand district, South Africa<br><br>production process:<br>250 g of crocidolite + 1650 ml hydrochloric acid in a 2000 ml becher or crocidolite entirely covered with hydrochloric acid in a vertical container / soaking: 1 wk. / drying on hot plate (formation of 2 superimposed layers of colours, the one at the surface being «dark green [mint-green type]») / irradiated with electrons at 162,431 rad |
| green-grey | 9105 | mineral : beryl<br>rock : intense grass-green, slightly translucid<br>powder : greenish grey<br>origin : unknown<br><br>production process:<br>3 g of beryl + 40 ml phosphoric acid / soaking: 2 wk. / drying on hot plate / colour of the solid[30] |
| grey (light green tone) | 9106 | mineral : copper<br>rock : reddish brown, with metallic luster<br>powder : reddish brown, with metallic luster<br>origin : unknown<br><br>production process:<br>(followed from «greyish green darker than "greyish green"»)<br>100 g of copper + 100 ml nitric acid / soaking: 5 months / natural drying (light bluish turquoise) / 0↑500 °F<br>(followed at «iron-grey») |
| grey (light green | 9107 | mineral : cement[269]<br>powder : medium brownish grey<br>origin : CALCO, Charlesbourg, Québec<br><br>mineral : chrome<br>powder : light grey, with metallic brilliance<br><br>production process:<br>(followed from «brownish grey lighter than "medium brownish grey"»)<br>1.50 g of cement + .50 g of chrome / 1325 °F / 1 h |

| | | |
|---|---|---|
| tone) ↓ | | (followed at «light greyish beige») |
| ↓ | | (followed from «light greyish beige») |
| grey (green tone a bit more accentuated) | 9108 | 1.50 g of cement + .50 g of chrome / 1350 °F / 1 h |
| grey (green tone still a bit more accentuated) | 9109 | 1.50 g of cement + .50 g of chrome / 1400 °F / 1 h (followed at «very light beige [light green tone]») |
| ↓ grey (green tone still a bit more accentuated) | 9110 | 1.50 g of cement + .50 g of chrome / 1500 °F / 1 h (followed at «very light green [nears beige]» and «light beige [light green tone]») |
| | | mineral : chromite[294]<br>rock : dark grey<br>powder : dark grey<br>origin : Black Lake, Eastern Townships, Québec<br><br>mineral : cement[269]<br>powder : medium brownish grey<br>origin : CALCO, Charlesbourg, Québec<br><br>production process:<br>(followed from «grass-green») |
| green-grey | 9111 | 1.50 g of cement + .25 g of chromite / 1000 °C / 2 h[320,321] |
| | | mineral : uraninite<br>rock : medium chocolate-brown (red Bordeau tone)<br>powder : medium milky chocolate-brown<br>origin : Yellowknife, Canada<br><br>production process: |
| grey (light green tone) | 9112 | 8 g of uraninite + 100 ml sulphuric acid / soaking: 2 wk. / drying on hot plate |
| | | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process: |
| green-grey | 9113 | 0↑1900 °F (dark iron-grey): 1 g + 80 ml phosphoric acid / soaking: 2 wk. / drying on hot plate (still |

| | | |
|---|---|---|
| | | humid) / colour of the liquid[160] |
| grey (light green tone) | 9114 | mineral : steatite<br>rock : light cold grey, slightly translucid<br>powder : light grey<br>origin : East Broughton, Québec<br><br>production process:<br>(followed from «brownish orange»)<br>0↑1500 °F (brownish grey): 2 g + 25 ml hydrochloric acid / soaking: 3 d. / drying on hot plate (followed at «grey [light brown tone]») |
| green-grey | 9115 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>powder finely grinded and heated 0↑1100 °F (Naples yellow [light green tone]): .50 g + 15 ml nitric acid / soaking: 2 d. / slow drying on hot plate (light blue): .2 g + 50 cc of transparent polyester resin + 1% of catalyst / manual grinding / moulding / hardening (pale greyish green) / irradiated with electrons at 155,082 rad<br>(followed at «greyish green much more accentuated than "pale greyish green"») |
| green-grey (with some dark green particles) | 9116 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br>production process:<br>3 g of molybdenite grinded to a fine powder + 30 ml nitric acid / soaking: 3 d. / drying on hot plate (very intense blue): .07 g + 6 cc of polymer used for concrete + 0.18 cc of catalyst + 1.50 thousandth of a g of cobalt 6% + 2 g of cement / manual grinding / moulding / hardening (medium greyish green [brown tone]) / irradiated with |

1728

| | | |
|---|---|---|
| | | gamma rays at 18.85 Mrad |
| grey (light green tone) | 9117 | mineral : nickel sulphide<br>rock : dark grey<br>powder : dark grey<br>origin : Sudbury, Ontario<br><br>production process:<br>2 g of nickel sulphide + 25 ml sulphuric acid / soaking: 24 h / drying on hot plate |
| green-grey | 9118 | production process:<br>130 g of nickel sulphide+100 ml sulphuric acid or nickel sulphide entirely covered with sulphuric acid / soaking: 3 months / drying on hot plate |
| green-grey more pale than «medium green-grey» | 9119 | mineral : hornblende<br>rock : medium evergreen (light grey tone), with a vitreous brilliance<br>powder : medium cold grey (light green tone)<br>origin : Abitibi, Québec<br><br>production process:<br>powder irradiated with gamma rays at 64.7 Mrad (followed at «brownish grey [green reflection]») |
| medium grey (very light green tone) | 9120 | mineral : anorthosite<br>rock : light grey<br>powder : very, very light greyish beige<br>origin : rang Sainte-Germaine, Oka, Québec<br><br>production process:<br>(followed from «light pinkish beige»)<br>2 g of anorthosite + 2 g of sodium carbonate / 0↑1400 °F + 1 h at 1400 °F<br>(followed at «grey [with blue particles]») |
| medium grey (light green tone) | 9121 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑1100 °F + 1 h at 1100 °F (creamy yellow [light green tone]) / irradiated with electrons at 302,831 rad[45] |

| | | |
|---|---|---|
| grey (accentuated green tone) a bit more intense and luminous than «medium green-grey» | 9122 | mineral : hornblende<br>rock : medium evergreen (light grey tone), with a vitreous brilliance<br>powder : medium cold grey (light green tone)<br>origin : Abitibi, Québec<br><br><u>production process:</u><br>powder irradiated with electrons at 302,831 rad[34] |
| | | mineral : chalcopyrite<br>powder : dark grey (light green tone)<br>origin : Centre de recherche des Mines Noranda in Montréal, Québec<br><br><u>production process:</u><br>powder irradiated with gamma rays at: |
| green-grey | 9123 | 5 Mrad |
| green-grey more accentuated and darker | 9124 | 10 Mrad |
| green-grey still more accentuated and darker | 9125 | 57.4 Mrad |
| green-grey still more accentuated and darker | 9126 | 64.7 Mrad |
| green-grey more accentuated and darker | 9127 | 102.4 Mrad |
| green-grey still more accentuated and darker | 9128 | 148.4 Mrad |
| green-grey still more accentuated and darker | 9129 | 201.6 Mrad |
| green-grey more accentuated and darker | 9130 | 247.6 Mrad |
| green-grey still more accentuated and darker | 9131 | 287.3 Mrad |

| | | |
|---|---|---|
| green-grey still more accentuated and darker<br>↓ | 9132 | 360 Mrad |
| green-grey [between «medium» and «dark» green-grey] | 9133 | 424.7 Mrad[1140] |
| | | mineral : agate<br>rock : dark grass-green, slightly translucid<br>powder : light grey (light green tone)<br>origin : bank of Saint-Lawrence river, region of Maria, Gaspésie, Québec<br><br><u>production process:</u><br>1 g of agate + 1 cc of synthetic white transparent enamel paint used for the car / manual grinding / application on a piece of steel sheet used for the car's body measuring 1" x 1" (greenish grey) / irradiated with gamma rays at: |
| dark green-grey<br>↓ | 9134 | 5 Mrad<br><br>(followed at «medium chocolate-brown»)<br><br>(followed from «medium chocolate-brown») |
| dark green-grey | 9135 | 247.6 Mrad<br>(followed at «dark brownish grey») |
| | | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br><u>production process:</u><br>(followed from «pale grass-green [grey tone]») |
| dark green-grey | 9136 | .50 g of calcite + .50 g of chrome + .50 g of SiC / 0↑1800 °F (dark grey) / addition of 1 g of calcite / the mixture is humidified with water[1141] / 1800 °F / 30 min. / cooling / addition to the mixture of 1 g of calcite / humidified with water / 1800 °F / 30 min. |
| | | mineral : graphite |

1731

| | | |
|---|---|---|
| dark green-grey | 9137 | rock : dark grey, with metallic brilliance<br>powder : dark grey, with metallic brilliance<br>origin : Grenville, Québec<br><br>production process:<br>4 g of graphite + 20 ml sulphuric acid / soaking: 24 h / drying on hot plate[1142] |
| dark grey (light green tone) | 9138 | mineral : nickel sulphide<br>rock : dark grey<br>powder : dark grey<br>origin : Sudbury, Ontario<br><br>production process:<br>2 g of nickel sulphide + 20 ml hydrofluoric acid / soaking: 24 h / drying in drying oven at 100 °F |
| | 9139 | mineral : obsidian<br>rock : dark grey (green tone)<br>origin : zone of Grand Rapids on the Matagami river, at the mouth of Adams Creek, Ontario |
| green-grey more accentuated and darker than «dark green-grey» | 9140 | production process:<br>rock irradiated with gamma rays at 55 Mrad |
| grey (grass-green tone) | | |
| grey (localized grass-green tone) | 9141 | mineral : chromite[294]<br>rock : dark grey<br>powder : dark grey<br>origin : Black Lake, Eastern Townships, Québec<br><br>mineral : cement[1138]<br>powder : white<br><br>production process:<br>(followed from «grey»)<br>1 g of chromite + 27.40 g of cement + 13 cc of water / manual grinding / moulding / hardening / 0↑1800 °F<br>(followed at «grass-green») |
| grey (olive-green tone) | | |
| | | mineral : andulusite<br>rock : light brownish grey<br>powder : light grey |

1732

| | | |
|---|---|---|
| grey (olive-green tone) or beige (olive-green tone) | 9142 | origin : Bimbowrie, South Australia<br><br>production process:<br>0↑1900 °F (light beige): 1 g + 50 ml sulphuric acid / soaking: 2 wk. / separation of the liquid and the solid / drying on hot plate (colour of the liquid: opaque white) / irradiated with gamma rays 70.4 Mrad<br>(followed at «mixture of particles: medium grey [olive-green tone] / medium orange [beige tone]») |
| mixture of particles | | |
| medium grey (olive -green tone) / medium orange (beige tone) | 9143 | mineral : andulusite<br>rock : light brownish grey<br>powder : light grey<br>origin : Bimbowrie, South Australia<br><br>production process:<br>(followed from «grey [olive-green tone] or beige [olive-green tone]»)<br>0↑1900 °F (light beige): 1 g + 50 ml sulphuric acid / soaking: 2 wk. / separation of the liquid and the solid / drying on hot plate (colour of the liquid: opaque white) / irradiated with gamma rays at 430.4 Mrad |
| green-grey (blue tone) | | |
| grey (blue-green reflection), with some dark «indigo -blue» particles | 9144 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br>production process:<br>powder finely grinded and heated 0↑1200 °F (Naples yellow): .50 g + 15 ml sulphuric acid / soaking: 2 d. / slow drying on hot plate (very intense blue): .07 g + 6 cc of polymer used for concrete + 0.18 cc of catalyst + 1.50 thousandth of a g of cobalt 6% + 2 g of cement / manual grinding / moulding / hardening (medium grey [greenish blue tone]), with blue particles) / irradiated with gamma rays at 18.85 Mrad |

| | | |
|---|---|---|
| green-grey (yellow tone) | | |
| grey (yellow-green reflection) much more intense than «light grey (yellow-green reflection)» | 9145 | mineral : ochre[20]<br>powder : orange<br>origin : small copper and nickel deposit, in the South-Western area of a mass of serpentinite at 3 km at the West of Saint-Fabien-de-Panet, Québec<br><br>production process:<br>(followed from «light greyish brown»)<br>3 g of ochre + 20 ml hydrofluoric acid / soaking: 24 h / drying in drying oven at 100 °F (light grey): .3 g + 50 cc of transparent polyester resin + 1% of catalyst / manual grinding / moulding / hardening (light grey [light yellow reflection]) / irradiated with electrons at 305,082 rad[354] |
| grey (yellow-green reflection) more intense and darker than «light grey (yellow-green reflection)» | 9146 | mineral : amazonite<br>rock : greenish turquoise<br>powder : white (turquoise reflection)<br>origin : Lac Saint-Jean, Québec<br><br>production process:<br>(followed from «light beige»)<br>2 g of amazonite + 20 ml hydrochloric acid / soaking: 3 d. / drying on hot plate (very light yellowish green): .2 g + 50 cc of transparent polyester resin + 1% of catalyst / manual grinding / moulding / hardening (very light grey [light yellow reflection]) / irradiated with electrons at 305,082 rad[354] |
| green-grey (orange tone) | | |
| light green-grey (light orange tone) | 9147 | mineral : olivine<br>rock : light grey, crystalline<br>powder : very light grey<br>origin : Mont Albert, Gaspésie, Québec<br><br>production process:<br>0↑1100 °F<br><br>(followed at «light orange-beige») |
| green-grey (beige tone) | | |
| | | mineral : olivine<br>powder : colourless (green reflection)<br>origin : Mount Haven, United States |

| | | |
|---|---|---|
| light green-grey (beige tone)<br>↓<br>light green-grey (beige tone) | 9148<br><br>9149 | <u>production process:</u><br>(followed from «light greenish grey»)<br>powder irradiated with gamma rays at:<br>201.6 Mrad<br><br>247.6 Mrad[1143]<br>(followed at «beige-grey») |
| green-grey (brown tone) | | |
| green-grey (light brown reflection) much darker than «very light green-grey (brown reflection)» | 9150 | mineral : hornblende<br>rock : medium evergreen (light grey tone), with a vitreous brilliance<br>powder : medium cold grey (light green tone)<br>origin : Abitibi, Québec<br><br><u>production process:</u><br>(followed from «very light greyish beige or beige-grey»)<br>3 g of hornblende + 20 ml hydrofluoric acid / soaking: 24 h / drying in drying oven at 100 °F (white): .2 g + 50 cc of transparent polyester resin + 1% of catalyst / manual grinding / moulding / hardening (very light grey) / irradiated with electrons at 305,082 rad[354] |
| green-grey (brown reflection) much darker and more accentuated than «light green-grey (brown reflection)» | 9151 | mineral : fluorescent calcite<br>rock : white (localized grey or brown reflection), translucid<br>powder : white (yellow reflection)<br>origin : Bancroft, Ontario<br><br><u>production process:</u><br>(followed from «light brown»)<br>4 g of calcite + 20 ml hydrochloric acid / soaking: 3 d. / drying on hot plate (brown): .3 g + 50 cc of transparent polyester resin + 1% of catalyst / manual grinding / moulding / hardening (light grey [light green reflection]) / irradiated with electrons at 305,082 rad[354] |
| grey (green and brown tones) | 9152 | mineral : epidote<br>rock : green (light brown tone [olive-green type])<br>powder : grey (greenish brown tone)<br>origin : Deloro Road, Madoc, Ontario<br><br><u>production process:</u><br>12 g of epidote + 40 ml phosphoric acid / soaking: 2 wk. / drying on hot plate (still humid) / colour |

1735

| | | |
|---|---|---|
| | | of the solid[30,1144] |
| grey (light green and brown tones), much more pale than «medium grey (green and brown tones)» | 9153 | mineral : peridotite<br>rock : medium grey<br>powder : medium brownish grey (green reflection)<br>origin : Thetford Mines, Québec<br><br>production process:<br>powder irradiated with gamma rays at 190.22 Mrad<br><br>(followed at «medium chocolate-brown [orange reflection]») |
| grey (yellow tone) | | |
| very, very light grey (very light yellow reflection) | 9154 | mineral : beryl<br>rock : very light yellowish green, slightly translucid<br>powder : white (green reflection)<br>origin : Lacorne district, Abitibi, Québec<br><br>production process:<br>1000 °C / 1 h (white [very light pinkish beige reflection]) / powder irradiated with electrons at 302,831 rad[36] |
| grey (light yellow reflection) more accentuated and a bit darker than «very, very light yellow-grey» | 9155 | mineral : amazonite<br>rock : greenish turquoise<br>powder : white (turquoise reflection)<br>origin : Lac Saint-Jean, Québec<br><br>production process:<br>(followed from «light grey»)<br>2 g of amazonite + 20 ml nitric acid / soaking: 3 d. / drying on hot plate (light green): .2 g + 50 cc of transparent polyester resin + 1% of catalyst / manual grinding / moulding / hardening (very, very light grey) / irradiated with electrons at 305,082 rad[354] |
| grey (accentuated and dark yellow | 9156 | mineral : calcite<br>rock : light pink<br>powder : pinkish white<br>origin : Huddersfield district, Pontiac county, Québec<br><br>production process:<br>(followed from «light beige [yellow reflection]»)<br>4 g of calcite + 20 ml hydrochloric acid / soaking: 3 d. / drying on hot plate |

| | | |
|---|---|---|
| reflection) a bit more intense than «very, very light yellowish grey» | | (vivid yellow [light orange tone]): .3 g + 50 cc of transparent polyester resin + 1% of catalyst / manual grinding / moulding / hardening (very, very light yellowish grey) / irradiated with electrons at 305,082 rad[354] |
| very light yellow-grey | 9157 | mineral : asbestos[4]<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Québec<br><br>production process:<br>50 g of asbestos + 200 ml hydrochloric acid or asbestos entirely covered with hydrochloric acid / soaking: 1 wk. / drying on hot plate (vivid yellow): .50 g + .50 g of zirconium silicate |
| very light yellow-grey | 9158 | production process:<br>50 g of asbestos + 200 ml hydrochloric acid or asbestos entirely covered with hydrochloric acid / soaking: 1 wk. / drying on hot plate (vivid yellow): .50 g + .50 g of zirconium silicate (very light yellowish grey) / irradiated with gamma rays at 63.984 Mrad<br>(followed at «light yellow») |
| very light grey (accentuated yellow tone) | 9159 | mineral : serpentine<br>rock : yellowish green<br>powder : light greenish yellow<br>origin : probably Thetford Mines, Eastern Townships, Québec<br><br>production process:<br>(followed from «light greyish beige»)<br>3 g of serpentine + 25 ml sulphuric acid / soaking: 24 h / drying on hot plate (light grey [light brown tone]): .3 g + 50 cc of transparent polyester resin + 1% of catalyst / manual grinding / moulding / hardening (very light grey [light yellow reflection]) / irradiated with electrons at 305,082 rad[354] |
| | | mineral : calcite[11]<br>powder : white<br>origin : Calcite du Nord Company, Saint-Eugène de Mistassini, Lac Saint-Jean, Québec |

1737

| | | |
|---|---|---|
| grey (yellow reflection) more accentuated than «very light yellow-grey» | 9160 | <u>production process:</u><br>(followed from «light beige»)<br>.3 g of calcite + 50 cc of transparent polyester resin + 1% of catalyst / manual grinding / moulding / hardening (very light grey [light yellow reflection]) / irradiated with electrons at 305,082 rad[354] |
| grey (accentuated yellow reflection) a bit darker than «very light yellow-grey» | 9161 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br><u>production process:</u><br>(followed from «beige-grey»)<br>2 g of fluorine + 20 ml nitric acid / soaking: 3 d. / drying on hot plate (dark milky chocolate-brown): .2 g + 50 cc of transparent polyester resin + 1% of catalyst / manual grinding / moulding / hardening (very light grey [light yellow reflection]) / irradiated with electrons at 305,082 rad[354] |
| light grey (accentuated yellow reflection) | 9162 | mineral : mica<br>rock : golden brown, with vitreous luster, translucid<br>powder : light amber, with vitreous luster, translucid<br>origin : Lac Vert mountain, region of Low, near Hincks, Québec<br><br><u>production process:</u><br>(followed from «light greyish beige or beige-grey»)<br>sheet heated 0↑2000 °F (golden yellow): .2 g + 50 cc of transparent polyester resin + 1% of catalyst / manual grinding / moulding / hardening (very light grey [light yellow reflection]) / irradiated with electrons at 305,082 rad[354] |
| grey (accentuated yellow reflection) | 9163 | mineral : apatite<br>rock : light grass-green (light blue and yellow tones), very slightly translucid<br>powder : very light grey (light green tone)<br>origin : region of Buckingham, Québec<br><br><u>production process:</u><br>(followed from «beige darker than "light beige"»)<br>3 g of apatite + 20 ml nitric acid / soaking: 3 d. / drying on hot plate (white [yellow reflection]): |

| | | |
|---|---|---|
| a bit darker than «light yellow-grey» | | .3 g + 50 cc of transparent polyester resin + 1% of catalyst / manual grinding / moulding / hardening (light grey [yellow reflection]) / irradiated with electrons at 305,082 rad[354] |
| yellow-grey a bit darker and more intense than «light yellow-grey» | 9164 | mineral : olivine<br>powder : colourless (green reflection)<br>origin : Mount Haven, United States<br><br>production process:<br>(followed from «light beige-grey»)<br>3 g of olivine + 20 ml hydrofluoric acid / soaking: 24 h / drying in drying oven at 100 °F (light cream [light orange tone]): .2 g + 50 cc of transparent polyester resin + 1% of catalyst / manual grinding / moulding / hardening (light grey [very light yellow reflection]) / irradiated with electrons at 305,082 rad[354] |
| | | mineral : asbestos[4]<br>rock : dark grey (green reflection)<br>powder : light grey (green reflection)<br>origin : Asbestos Corporation Ltd., Thetford Mines, Québec<br><br>production process:<br>rock irradiated with gamma rays at: |
| grey (light yellow tone)<br>↓ | 9165 | 5 Mrad[1145] |
| grey (light yellow tone)<br>↓ | 9166 | 10 Mrad |
| grey (light yellow tone)<br>↓ | 9167 | 57.4 Mrad |
| grey (more accentuated yellow tone) | 9168 | 65.704 Mrad<br>(followed at «orange») |
| medium grey (yellow tone) | 9169 | mineral : cement[82]<br>powder : medium cold grey<br>origin : Union des Carrières, Limoilou, Québec<br>production process:<br>45 g of cement + 100 ml sulphuric acid or cement entirely covered with sulphuric acid / soaking: 3 months / drying on hot plate |
| | | mineral : pyrolusite[101]<br>rock : black (light brown tone), mat |

| | | |
|---|---|---|
| very dark grey [almost black] (light yellow tone) | 9170 | powder : black (light brown tone), mat<br>origin : probably Nova Scotia<br><br>production process:<br>4 g of pyrolusite + 25 ml nitric acid / soaking: 24 h / drying on hot plate |
| grey (green-yellow tone) | | |
| grey (green-yellow tone) a bit more accentuated than «very light grey (green-yellow tone)» | 9171 | mineral : hornblende<br>rock : medium evergreen (light grey tone), with a vitreous brilliance<br>powder : medium cold grey (light green tone)<br>origin : Abitibi, Québec<br><br>production process:<br>(followed from «light greyish beige or beige-grey») 3 g of hornblende + 20 ml phosphoric acid / soaking: 3 d. / drying on hot plate [still humid] (very light grey): .3 g + 50 cc of transparent polyester resin + 1% of catalyst / manual grinding / moulding / hardening (very light grey) / irradiated with electrons at 305,082 rad[354] |
| grey (green-yellow reflection) darker and more accentuated than «very light grey (green-yellow reflection)» | 9172 | mineral : orthoclase<br>rock : light pinkish beige<br>powder : very light beige<br>origin : mine near Buckingham, Papineau county, Québec<br><br>production process:<br>(followed from «light beige»)<br>.3 g of orthoclase + 50 cc of transparent polyester resin + 1% of catalyst / manual grinding / moulding / hardening (very light grey) / irradiated with electrons at 305,082 rad[354] |
| grey (light green yellow reflection) a bit darker than «very light grey | 9173 | mineral : sphalerite[31]<br>rock : honey-yellow<br>powder : pale honey-yellow<br>origin : Federal Mine, Lemieux district, Gaspésie, Québec<br><br>production process:<br>(followed at «light beige»)<br>80 g of sphalerite + 100 ml nitric acid / soaking: 5 months / natural drying (very light cream, almost white): .3 g + 50 cc of transparent polyester resin + 1% of catalyst / manual grinding / moulding |

| | | |
|---|---|---|
| green-yellow reflection)» | | / hardening (very light cold grey) / irradiated with electrons at 305,082 rad[354] |
| light grey (green-yellow reflection) | 9174 | mineral : beryl<br>rock : light blue, slightly translucid<br>powder : light grey<br>origin : Abitibi, Québec<br><br>production process:<br>(followed from «light greyish brown or brown-grey») .3 g of beryl + 50 cc of transparent polyester resin + 1% of catalyst / manual grinding / moulding / hardening (very light grey) / irradiated with electrons at 305,082 rad[354] |
| grey (green-yellow reflection) more accentuated than «light grey (green-yellow reflection)» | 9175 | mineral : calcite[11]<br>powder : white<br>origin : Calcite du Nord Company, Saint-Eugène de Mistassini, Lac Saint-Jean, Québec<br><br>production process:<br>(followed from «light greyish beige»)<br>4 g of calcite + 20 ml hydrofluoric acid / soaking: 24 h / drying in drying oven at 100 °F (white [light yellow reflection]): .3 g + 50 cc transparent polyester resin + 1% of catalyst / manual grinding / moulding / hardening (light grey [very light yellow reflection]) / irradiated with electrons at 305,082 rad[354] |
| pink-grey | | |
| very, very light pink-grey | 9176 | mineral : quartz<br>rock : light pink, translucid<br>powder : very light grey<br>origin : unknown<br><br>production process:<br>4 g of quartz + 40 m sulphuric acid / soaking: 22 d. / drying on hot plate (white) / irradiated with electrons at 305,200 rad[46] |
| light grey (light localized pink | 9177 | mineral : amazon stone<br>rock : light greenish turquoise, translucid<br>powder : white (turquoise reflection)<br>origin : unknown<br><br>production process:<br>1600 °F / 1 h (very, very light beige [very light pink tone]) / rock irradiated with electrons at |

1741

| | | |
|---|---|---|
| tone) | | 305,200 rad[46] |
| light grey (very light pink tone) | 9178 | mineral : orthoclase<br>rock : white (grey reflection)<br>powder : white (grey reflection)<br>origin : mine near Buckingham, Papineau county, Québec<br><br>production process:<br>1000 °C / 1 h (very, very light pinkish beige [almost white]) / powder irradiated with electrons at 302,831 rad[36] |
| light grey (light pink tone)<br>↓ | 9179 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>2 g of ochre + 1 g of titanium dioxide:<br>0↑ 700 °F |
| darker grey (light pink tone) | 9180 | 0↑1000 °F<br>(followed at «brownish grey [accentuated pink tone]») |
| light grey (very light pink tone)<br>↓ | 9181 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>1 g of ochre + 1 g of zirconium silicate + 1 g of titanium dioxide:<br>0↑ 700 °F |
| grey a bit darker (slightly accentuated pink tone) | 9182 | 0↑1000 °F<br>(followed at «medium greyish beige [pink tone]») |

1742

| | | |
|---|---|---|
| light grey (very light pink tone) | 9183 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br><u>production process:</u><br>2000 °F / 45 min.<br>(followed at «light grey [pinkish beige tone]») |
| pink-grey much more pronounced than «light pink-grey» | 9184 | <u>production process:</u><br>0↑2300 °F (light grey [pinkish beige tone]) / irradiated with electrons at 302,831 rad[36] |
| grey (very light pink tone) | 9185 | mineral : fluorescent calcite<br>rock : white (localized grey or brown reflection), translucid<br>powder : white (yellow reflection)<br>origin : Bancroft, Ontario<br><br><u>production process:</u><br>2 g of calcite + 2 g of sodium carbonate / 0↑1500 °F + 45 min. at 1500 °F (white [green reflection]) / irradiated with gamma rays at 64.7 Mrad<br>(followed at «mixture of particles: very light beige / light grey») |
| medium pink-grey | 9186 | mineral : ilmenite<br>rock : blackish grey, with metallic luster<br>powder : blackish grey, with metallic luster<br>origin : Québec Fer et Titane Co., Havre Saint-Pierre, Québec<br><br><u>production process:</u><br>2 g of ilmenite + 2 g of sodium carbonate / 0↑1500 °F + 15 min. at 1500 °F (brown [reddish orange tone], between «medium and dark brown [reddish orange tone]») / irradiated with electrons at 302,831 rad[36] |
| | | mineral : pyrite<br>rock : pale brass-yellow, with metallic brilliance<br>powder : brownish grey (with golden yellow particles)<br>origin : Noranda Mines, Noranda, Abitibi, Québec<br><br>mineral : sulphur |

| | | |
|---|---|---|
| grey (light pink tone) lighter than «dark pink-grey» | 9187 | rock : brilliant yellow<br>powder : brilliant yellow<br>origin : unknown<br><br><u>production process:</u><br>2 g of pyrite + 2 g of sulphur / 1300 °F / 1 h |
| grey (accentuated pink tone) a bit darker than «dark pink-grey» | 9188 | <u>production process:</u><br>2 g of pyrite + 2 g of sulphur / 1300 °F / 1 h (dark grey [light pink tone]) / irradiated with gamma rays at 424.7 Mrad[81,239] |
| grey (lilac-pink tone) | | |
| grey (lilac-pink tone) a bit more accentuated than «grey (lilac-pink tone)» | 9189 | mineral : fluorine<br>rock : reddish violet, translucid<br>powder : very light grey<br>origin : Ohio, United States<br><br><u>production process:</u><br>(followed from «beige [lilac-pink tone]»)<br>1 g of fluorine + 1 cc of synthetic white transparent enamel paint used for the car / manual grinding / application on a piece of steel sheet used for the car's body measuring 1" x 1" (greyish cream) / irradiated with gamma rays at 18.85 Mrad (followed at «old rose [brown tone]») |
| pink-grey (beige tone) | | |
| pink grey (beige tone) | 9190 | mineral : apophyllite<br>rock : milky white, translucid<br>powder : white<br>origin : Gaspé Copper Mine, Gaspé, Québec<br><br><u>production process:</u><br>powder irradiated with gamma rays at 64.7 Mrad (followed at «greyish brown or brownish grey») |
| red-grey | | |
| | | mineral : calcite[11]<br>powder : white<br>origin : Calcite du Nord Company, Saint-Eugène de Mistassini, Lac Saint-Jean, Québec<br><br>mineral : apatite<br>rock : medium brownish red |

1744

| | | |
|---|---|---|
| | | powder : light pinkish beige<br>origin : Ile Calumet, Pontiac county, Québec<br><br>production process:<br>1 g of calcite + 1 g of asbestos / 1000 °C / 1 h |
| medium grey (light red tone) | 9191 | |
| grey | | |
| | | mineral : albite<br>rock : colourless (pink reflection)<br>origin : De-Mix quarry, North side of Mont Saint-Hilaire, Rouville county, Québec<br><br>production process: |
| grey reflection | 9192 | rock irradiated with gamma rays at 65.704 Mrad[1146]<br>(followed at «beige reflection») |
| | | mineral : quartz (with impurities of white kaolinite)<br>rock : opaline white, slightly translucid<br>origin : quarry near Saint-Rémi d'Amherst, Québec<br><br>production process:<br>rock irradiated with gamma rays at: |
| light grey or beige tint<br>↓ | 9193 | 5 Mrad[1147] |
| grey or beige tint a bit more accentuated | 9194 | 10 Mrad<br><br>(followed at «light grey») |
| | | mineral : peridotite<br>rock : medium grey<br>powder : medium brownish grey (green reflection)<br>origin : Thetford Mines, Québec<br>production process:<br>(followed from «grey [light green tone]»)<br>1 g of peridotite + 1 cc of synthetic white transparent enamel paint used for the car / manual grinding / application on a piece of steel sheet used for the car's body measuring 1" x 1" (very pale greenish grey) / irradiated with gamma rays at: |
| grey more intense than «very pale grey»<br>↓ | 9195 | 10 Mrad |
| grey still more intense | 9196 | 57.4 Mrad<br>(followed at «medium orange-brown») |

1745

| | | |
|---|---|---|
| | | mineral : steatite<br>rock : light evergreen<br>powder : white<br>origin : East Broughton, Québec<br><br>mineral : cement[1138]<br>powder : white<br><br><u>production process:</u><br>3 g of steatite + 27.40 g of cement + 13 cc of water / manual grinding / moulding / hardening: |
| pale grey | 9197 | 0↑1500 °F |
| pale grey | 9198 | 0↑1600 °F |
| pale grey | 9199 | 0↑1700 °F |
| pale grey | 9200 | 0↑1800 °F |
| pale grey | 9201 | 0↑1900 °F |
| pale grey ↓ | 9202 | 0↑1950 °F |
| | | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow<br>origin : unknown<br><br>mineral : cement[1138]<br>powder : white<br><br><u>production process:</u> |
| various pale greys | 9203 | 1 g of tremolite + 27.40 g of cement + 13 cc of water / manual grinding / moulding / hardening / 0↑1900 °F |
| | 9204 | 1 g of tremolite + 1 g of sulphur + 27.40 g of cement + 13 cc of water / manual grinding / moulding / hardening / 0↑1900 °F |
| | 9205 | 1 g of tremolite + 1 g of potassium carbonate + 1 g of sulphur + 27.40 g of cement + 13 cc of water / manual grinding / moulding / hardening / 0↑1900 °F |
| ↓ | 9206 | 1 g of tremolite + 1 g of potassium carbonate + 27.40 g of cement + 13 cc of water / manual grin- |

| | | |
|---|---|---|
| | | ding / moulding / hardening / 0↑1900 °F |
| very, very light grey [almost white] ↓ grey a bit darker ↓ grey still a bit darker | 9207<br>9208<br>9209 | mineral : amazonite<br>rock : light greenish turquoise<br>powder : white (turquoise reflection)<br>origin : Lac Sairs, Témiscamingue, Québec<br><br>production process:<br>2 g of amazonite + 2 g of sodium carbonate:<br>0↑1300 °F + 1 h at 1300 °F<br><br>0↑1400 °F + 1 h at 1400 °F<br><br>0↑1500 °F + 1 h at 1500 °F<br>(followed at «pale brown») |
| very, very light grey [almost white], with a few «cobalt-blue» particles | 9210 | mineral : beryl<br>rock : intense grass-green, slightly translucid<br>powder : greenish grey<br>origin : unknown<br><br>production process:<br>3 g of beryl + 40 ml sulphuric acid / soaking: 18 d. / separation of the liquid and the solid / drying on hot plate / colour of the liquid[1147a] |
| very, very light grey [almost white] | 9211 | mineral : malachite<br>rock : ribboned variety of pronounced mint-green<br>powder : light and brilliant mint-green<br>origin : Katanga province, at 300 km from Lubumbachai, Zair, Africa<br><br>production process:<br>(followed from «white [grey reflection]»)<br>5 g of malachite + 25 ml ammonia / natural drying (mossy greenish turquoise): 2 g + 20 ml phosphoric acid / soaking: 3 d. / drying on hot plate (still humid) / colour of the solid[455] |
| | | mineral : stibnite<br>rock : dark grey, with metallic brilliance<br>powder : dark grey, with metallic brilliance<br>origin : Hunan, China |

| | | |
|---|---|---|
| very, very light grey [almost white] | 9212 | production process:<br>2000 °F / 45 min.[1148] |
| very, very light grey [almost white] | 9213 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : titanium dioxide<br>powder : white<br>origin : NL Chem Canada Inc., Québec<br><br>production process:<br>2 g of wilsonite + 2 g of sodium carbonate / 0↑1600 °F + 6 h at 1600 °F (azure-blue more intense than «azure-blue»): .50 g + .50 g of titanium dioxide |
| very, very light grey [almost white] | 9214 | mineral : blue lace agate<br>rock : light blue (violet tone), slightly translucid<br>powder : very light grey<br>origin : Africa<br><br>production process:<br>rock hermetically wrapped in bread dough / 1600 °F / 1 h |
| very, very light grey | 9215 | production process:<br>3 g of agate + 40 ml nitric acid / soaking: 1 wk. / separation of the liquid and the solid / natural drying (colour of the solid: white [green reflection]) / irradiated with electrons at 305,200 rad[46] |
| very, very light grey | 9216 | production process:<br>3 g of agate + 40 ml sulphuric acid / soaking: 18 d. / drying on hot plate (very light grey) / irradiated with electrons at 305,200 rad[46] |
| | | mineral : sardonyx<br>rock : white, slightly translucid (with a light orange-amber circular area on the surface)<br>powder : very light grey<br>origin : unknown |

| | | |
|---|---|---|
| very, very light grey ↓ grey slightly more grey | 9217<br>9218 | production process:<br>rock irradiated with gamma rays at:<br>5 Mrad<br>10 Mrad<br>(followed at «very, very light grey [blue reflection]») |
| very, very light grey | 9219 | mineral : armenite<br>rock : light grey<br>powder : very light grey<br>origin : Abitibi, Québec<br><br>production process:<br>powder irradiated with electrons at 302,831 rad[36] |
| very, very light grey | 9220 | mineral : beryl<br>rock : very light yellowish green, slightly translucid<br>powder : white (green reflection)<br>origin : Lacorne district, Abitibi, Québec<br><br>production process:<br>1000 °C / 1 h (white [very light pinkish beige reflection]) / powder irradiated with electrons at 302,831 rad[36] |
| very, very light grey | 9221 | mineral : corundum<br>rock : medium grey<br>powder : light grey<br>origin : Transvaal, Africa<br><br>production process:<br>0↑1900 °F (brown-grey): 1 g + 50 ml sulphuric acid / soaking: 2 wk. / drying on hot plate (light grey [light beige tone]) / irradiated with electrons at 302,831 rad[36] |
| very, very light grey | 9222 | mineral : dolomite<br>rock : white (localized yellow reflection), crystalline and translucid<br>powder : white<br>origin : Bristol district, Pontiac county, Québec<br><br>production process:<br>2 g of dolomite + 2 g of sodium carbonate / 0↑1300 °F + 1 h at 1300 °F<br>(followed at «light grey») |
| | | mineral : halite[41]<br>rock : colourless |

1749

| | | |
|---|---|---|
| very, very light grey | 9223 | powder : colourless<br>origin : Seleine Mine, Iles-de-la-Madeleine, Québec<br><br>production process:<br>2 g of halite + 20 ml ether / natural drying[1149] |
| very, very light grey | 9224 | mineral : crystalline quartz<br>rock : colourless<br>origin : Ferme Adam, Bonsecours, Eastern Townships, Québec<br><br>production process:<br>1600 °F / 1 h (semiopaque white) / rock irradiated with gamma rays at 64.7 Mrad (followed at «very light greyish beige») |
| very, very light grey | 9225 | production process:<br>1600 °F / 1 h (semiopaque white) / rock irradiated with electrons at 305,200 rad[46] |
| very, very light grey, more opaque | 9226 | mineral : milky quartz<br>rock : milky white, translucid<br>origin : Ferme Adam, Bonsecours, Eastern Townships, Québec<br><br>production process:<br>rock hermetically wrapped in bread dough / 1600 °F / 1 h |
| grey a bit lighter than «very light grey»<br>↓ | 9227 | mineral : silica[91]<br>powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>powder irradiated with electrons at:<br>162,431 rad |
| grey a bit darker than «very light grey» | 9228 | 302,831 rad[45] |
| | | mineral : blue lace agate<br>rock : light blue (violet tone), slightly translucid |

1750

| | | |
|---|---|---|
| very light grey | 9229 | powder : very light grey<br>origin : Africa<br><br><u>production process:</u><br>3 g of agate + 40 ml sulphuric acid / soaking: 18 d. / drying on hot plate |
| very light grey | 9230 | mineral : asbestos[4]<br>rock : dark grey (green reflection)<br>powder : light grey (green reflection)<br>origin : Asbestos Corporation Ltd., Thetford Mines, Québec<br><br>mineral : titanium dioxide<br>powder : white<br>origin : NL Chem Canada Inc., Québec<br><br><u>production process:</u><br>.50 g of asbestos + .50 g of titanium dioxide / grinding |
| very light grey | 9231 | mineral : asbestos[4]<br>rock : dark grey (green reflection)<br>powder : light grey (green reflection)<br>origin : Asbestos Corporation Ltd., Thetford Mines, Québec<br><br>mineral : zirconium silicate<br>powder : white (very light yellow reflection)<br>origin : Sial Company, Québec<br><br><u>production process:</u><br>.50 g of asbestos + .50 g of zirconium silicate / grinding |
| very light grey | 9232 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>.50 g of asbestos + .50 g of sodium carbonate / grinding |
| very light grey | 9233 | <u>production process:</u><br>2 g of asbestos + 2 g of sodium carbonate / grinding |
| | | mineral : analcime<br>rock : white (grey reflection), crystalline and translucid |

| | | |
|---|---|---|
| very light grey, cristalline and translucid | 9234 | powder : light grey<br>origin : De-Mix quarry, North side of Mont Saint-Hilaire, Rouville county, Québec<br><br>production process:<br>0↑2000 °F |
| very light grey | 9235 | mineral : anorthosite<br>rock : dark grey<br>powder : medium grey<br>origin : Jonquière, Lac Saint-Jean, Québec<br><br>production process:<br>6 g of anorthosite + 80 ml phosphoric acid / soaking: 2 wk. / drying on hot plate (still humid) / colour of the solid[1150] |
| very light grey | 9236 | mineral : apophyllite<br>rock : milky white, translucid<br>powder : white<br>origin : Gaspé Copper Mine, Gaspé, Québec<br><br>production process:<br>0↑2000 °F (light grey) / powder irradiated with electrons at 302,831 rad[36] |
| very light grey | 9237 | mineral : barite<br>rock : pinkish white<br><br>powder : white<br>origin : Niobec Mine, Saint-Honoré, Saguenay, Québec<br><br>production process:<br>2 g of barite + 2 g of sodium carbonate / 0↑1500 °F + 1 h at 1500 °F<br>(followed at «very light cream») |
| light grey (green reflection) | 9237.1 | mineral : bauxite<br>powder : pinkish beige, mat<br>origin : Alcan Company, French Guyana<br>production process:<br>20 g of bauxite + 20 g of caustic soda / 0↑955 °C (followed at «light greyish beige [green reflection]») |
| | | mineral : beryl<br>rock : very light yellowish green, slightly translucid<br>powder : white (green reflection) |

1752

| | | |
|---|---|---|
| very light grey | 9238 | origin : Lacorne district, Abitibi, Québec<br><br>production process:<br>(followed from «white [yellow reflection]»)<br>1000 °C / 1 h (white [very light pinkish beige reflection]) / powder irradiated with gamma rays at 122.984 Mrad<br>(followed at «light greyish cream [very, very light green reflection]») |
| very light grey | 9239 | mineral : calcite[11]<br>powder : white<br>origin : Calcite du Nord Company, Saint-Eugène de Mistassini, Lac Saint-Jean, Québec<br><br>production process:<br>44 g of calcite + 100 ml phosphoric acid / soaking: 3 wk. / drying on hot plate (still humid) |
| very light grey | 9240 | mineral : corundum<br>rock : medium grey<br>powder : light grey<br>origin : Transvaal, Africa<br><br>production process:<br>0↑1900 °F (brown-grey): 1 g + 50 ml phosphoric acid / soaking: 2 wk. / drying on hot plate (still humid) / colour of the solid[9] |
| | | mineral : cryolite<br>rock : white, crystalline and translucid<br>powder : white<br>origin : Ivigtut, Groenland<br><br>production process:<br>(followed from «white [beige reflection]»)<br>2 g of cryolite + 2 g of sodium carbonate: |
| very light grey | 9241 | 0↑1600 °F + 1 h at 1600 °F |
| ↓ | | |
| very light grey | 9242 | 0↑1700 °F + 1 h at 1700 °F |
| ↓ | | |
| very light grey | 9243 | 0↑1800 °F + 1 h at 1800 °F |
| ↓ | | |
| grey identical to the previous one | 9244 | 0↑1900 °F + 1 h at 1900 °F |
| | | mineral : dolomite<br>rock : light grey<br>powder : light grey<br>origin : Shefferville, Ungava, Québec |

1753

| | | |
|---|---|---|
| very light grey | 9245 | production process:<br>2 g of dolomite + 20 ml ammonia / natural drying |
| very light grey | 9246 | mineral : calcite[11]<br>powder : white<br>origin : Calcite du Nord Company, Saint-Eugène de Mistassini, Lac Saint-Jean, Québec<br><br>mineral : dolomite<br>rock : light grey<br>powder : light grey<br>origin : Shefferville, Ungava, Québec<br><br>production process:<br>1 g of calcite + 1 g of dolomite / 1000 °C / 1 h |
| very light grey | 9247 | mineral : dolomite<br>rock : white (localized yellow reflection), crystalline and translucid<br>powder : white<br>origin : Bristol district, Pontiac county, Québec<br><br>production process:<br>2 g of dolomite + 20 ml phosphoric acid / soaking: 3 d. / drying on hot plate (still humid) |
| very light grey | 9248 | mineral : fluorine<br>rock : very light fluor-green (cold mint-green type), translucid<br>powder : very light grey<br>origin : Rogers Mine, Madoc, Ontario<br><br>mineral : sulphur<br>rock : brilliant yellow<br>powder : brilliant yellow<br>origin : unknown<br><br>production process:<br>1 g of fluorine + 2 g of sodium carbonate + 1 g of sulphur / 1700 °F / 1 h |
| | | mineral : fluorine<br>rock : very pale yellow, translucid<br>powder : white (light yellow reflection)<br>origin : Ohio, United States<br><br>mineral : sulphur<br>rock : brilliant yellow<br>powder : brilliant yellow<br>origin : unknown |

| | | |
|---|---|---|
| very light grey | 9249 | <u>production process:</u><br>(followed from «medium brownish grey»)<br>1 g of fluorine + 1 g of sulphur / 1700 °F / 1 h |
| very light grey | 9250 | mineral : halite[41]<br>rock : colourless<br>powder : colourless<br>origin : Seleine Mine, Iles-de-la-Madeleine, Québec<br><br><u>production process:</u><br>(followed from «beige reflection»)<br>rock hermetically wrapped in bread dough / 1500 °F / 1 h (white more opaque than «colourless») / irradiated with electrons at 305,200 rad[73] |
| very light grey | 9251 | mineral : hornblende<br>rock : medium evergreen (light grey tone), with a vitreous brilliance<br>powder : medium cold grey (light green tone)<br>origin : Abitibi, Québec<br><br><u>production process:</u><br>3 g of hornblende + 20 ml phosphoric acid / soaking: 3 d. / drying on hot plate (still humid) |
| very light cold grey | 9252 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>powder irradiated with electrons at 302,831 rad[36] |
| very light grey ↓ | 9253 | mineral : orthoclase<br>rock : light pinkish beige<br>powder : very light beige<br>origin : mine near Buckingham, Papineau county, Québec<br><br><u>production process:</u><br>2 g of orthoclase + 2 g of sodium carbonate: 0↑1300 °F + 1 h at 1300 °F |

| | | |
|---|---|---|
| grey a bit darker than «very light grey» | 9254 | 0↑1400 °F + 1 h at 1400 °F<br><br>(followed at «brownish grey») |
| very light grey | 9255 | mineral : orthoclase<br>rock : white (grey reflection)<br>powder : white (grey reflection)<br>origin : mine near Buckingham, Papineau county, Québec<br><br><u>production process:</u><br>powder irradiated with electrons at 302,831 rad[36] |
| very light grey | 9256 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>3 g of quartz - mica + 20 ml hydrofluoric acid / soaking: 24 h / drying in drying oven at 100 °F |
| very light grey | 9257 | mineral : siderite<br>rock : caramel-brown (grey tone)<br>powder : light orange-beige<br>origin : De-Mix quarry, North side of Mont Saint-Hilaire, Rouville county, Québec<br><br><u>production process:</u><br>3 g of siderite + 20 ml phosphoric acid / soaking: 3 d. / drying on hot plate (still humid) / colour of the solid[30] |
| very light grey, with a white metallic brilliance<br>↓ | 9258 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>a 1 g rock is entirely covered with 20 ml nitric acid / soaking: 2 wk. / irradiated with gamma rays at 11.4 Mrad / drying on hot plate, completed on sand bath / colour of the rock[1151] |

| | | |
|---|---|---|
| very light grey, with a white metallic brilliance | 9259 | a 10 g rock is entirely covered with 20 ml nitric acid / soaking: 2 wk. / irradiated with gamma rays at 11.4 Mrad / drying on hot plate, completed on sand bath / colour of the rock[1151] |
| very light grey | 9260 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>3 g of iron sulphide - nickel + 27.40 g of cement + 13 cc of water / manual grinding / moulding / hardening (very light grey) / 0↑1100 °F (followed at «grey [beige tone]») |
| very light grey | 9261 | mineral : vesuvianite<br>rock : lilac<br>powder : lilac<br>origin : John Mansville Mine, Asbestos, Québec<br><br><u>production process:</u><br>12 g of vesuvianite + 40 ml phosphoric acid / soaking: 7 d. / drying on hot plate (still humid) / colour of the liquid[1152] |
| very light grey<br>↓<br>very light grey | 9262<br><br>9263 | mineral : wilsonite, local variety of scapolite or wernerite<br>rock : grey (violet tone)<br>powder : light grey (lilac tone)<br>origin : Tetreault Mine, Montauban, Portneuf county, Québec<br><br><u>production process:</u><br>(followed from «very light azure-blue»)<br>2 g of wilsonite + 1 g of potassium carbonate:<br>0↑1700 °F<br><br>0↑1800 °F |
| | | mineral : asbestos[4]<br>rock : dark grey (green reflection)<br>powder : light grey (green reflection)<br>origin : Asbestos Corporation Ltd., Thetford Mines, Québec |

| | | |
|---|---|---|
| grey a bit more accentuated than «very light grey»<br>↓<br>grey more pale and colder than «very light grey» | 9264<br><br><br><br>9265 | <u>production process:</u><br>.50 g of asbestos + .50 g of sodium carbonate (very light grey) / irradiated with electrons at:<br>162,431 rad<br><br>302,831 rad |
| grey more accentuated than «very light grey» | 9266 | mineral : armenite<br>rock : light grey<br>powder : very light grey<br>origin : Abitibi, Québec<br><br><u>production process:</u><br>powder irradiated with gamma rays at 64.7 Mrad (followed at «beige [pinkish orange tone]») |
| grey a bit darker than «very light grey» | 9267 | mineral : fluorine<br>rock : violet and white, translucid<br>powder : very light grey<br>origin : Saint-Lawrence Fluorspar Company, Saint-Lawrence, Newfoundland<br><br><u>production process:</u><br>powder irradiated with gamma rays at 65.704 Mrad<br><br>(followed at «beige») |
| grey much darker than «very light grey» | 9268 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>3 g of quartz - mica + 20 ml hydrofluoric acid / soaking: 24 h / drying in drying oven at 100 °F (very light grey) / irradiated with gamma rays at 64.7 Mrad<br>(followed at «light greyish beige») |
| | | mineral : andulusite<br>rock : light brownish grey<br>powder : light grey<br>origin : Bimbowrie, South Australia |

1758

| | | |
|---|---|---|
| cold grey much more pale than «light grey» | 9269 | <u>production process:</u><br>powder irradiated with electrons at 302,831 rad[36] |
| grey a bit more pale than «light grey» | 9270 | mineral : beryl<br>rock : light blue, slightly translucid<br>powder : light grey<br>origin : Abitibi, Québec<br><br><u>production process:</u><br>powder irradiated with electrons at 302,831 rad[36] |
| grey a bit more pale than «light grey» | 9271 | mineral : chalcopyrite<br>powder : dark grey (light green tone)<br>origin : Centre de recherche des Mines Noranda in Montréal, Québec<br><br><u>production process:</u><br>4 g of chalcopyrite + 100 ml sulphuric acid / soaking: 2 wk. / drying on hot plate (light grey) / irradiated with gamma rays at 64.7 Mrad (followed at «brownish grey») |
| grey a bit more pale and grey than «light grey» | 9272 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : sulphur<br>rock : brilliant yellow<br>powder : brilliant yellow<br>origin : unknown<br><br><u>production process:</u><br>2 g of wilsonite + 2 g of sulphur / 1300 °F / 1 h (light grey) / irradiated with electrons at 302,831 rad[36] |
| grey very lightly more pale than | 9273 | mineral : glass powder<br>powder : light grey<br>origin : residues of the cutting of the glass, Vitreries Lepage, city of Québec, Québec<br><u>production process:</u><br>irradiated with electrons at 302,831 rad[36] |

1759

| | | |
|---|---|---|
| «light grey» | | |
| grey a bit lighter than «light grey» | 9274 | mineral : asbestos[4]<br>rock : dark grey (green reflection)<br>powder : light grey (green reflection)<br>origin : Asbestos Corporation Ltd., Thetford Mines, Québec<br><br>production process:<br>3 g of asbestos + 20 ml ether / natural drying[1153] |
| grey a bit lighter than «light grey» | 9275 | production process:<br>3 g of asbestos + 20 ml ammonia / natural drying[1153] |
| grey a bit lighter and colder than «light grey» | 9276 | production process:<br>powder irradiated with electrons at 302,831 rad[36,67,73] |
| grey a bit lighter and colder [less brown] than «light grey, with indigo-blue particles» | 9277 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br>production process:<br>6 g of molybdenite + 50 ml sulphuric acid / soaking: 4 years / drying on hot plate (light grey [with blue particles]) / irradiated with electrons at 302,831 rad[36] |
| grey a bit lighter than «light grey» | 9278 | mineral : steatite<br>rock : cold light grey, slightly translucid<br>powder : light grey<br>origin : East Broughton, Québec<br><br>production process:<br>powder irradiated with electrons at 302,831 rad[36] |
| | | mineral : diopside<br>rock : light grey |

1760

| | | |
|---|---|---|
| grey lighter than «light grey» | 9279 | powder : light beige<br>origin : Mont Orford, Québec<br><br><u>production process:</u><br>rock irradiated with electrons at 305,200 rad[46,1154] |
| grey lighter than «light grey»<br>↓<br>grey still lighter | 9280<br><br>9281 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br><u>production process:</u><br>(followed from «grey»)<br>0↑700 °F[1155]<br><br>0↑800 °F<br>(followed at «grey [light beige tone]») |
| grey lighter than «light grey» | 9282 | mineral : fluorine<br>rock : very light yellow, translucid<br>powder : white (light yellow reflection)<br>origin : Saint-Lawrence Fluorspar Company, Saint-Lawrence, Newfoundland<br><br><u>production process:</u><br>2 g of fluorine + 20 ml ether / natural drying (light grey) / irradiated with gamma rays at 18.85 Mrad |
| light grey | 9283 | <u>production process:</u><br>2 g of fluorine + 20 ml ether / natural drying |
| light grey | 9284 | mineral : actinolite<br>rock : cold and light evergreen<br>powder : light grey (light green tone)<br>origin : erratic block found at Saint-Philémon near Dorchester, Québec<br><br><u>production process:</u><br>0↑1900 °F (light brown [very light orange tone]): 1 g + 80 ml phosphoric acid / soaking: 2 wk. / drying on hot plate (still humid)[1156] |

| | | |
|---|---|---|
| light grey | 9285 | production process:<br>3 g of actinolite + 80 ml phosphoric acid / soaking: 2 wk. / drying on hot plate (still humid)[1156] |
| cold light grey | 9286 | production process:<br>0↑1900 °F (light brown [very light orange tone]): 3 g + 80 ml sulphuric acid / soaking: 2 wk. / drying on hot plate |
| light grey | 9287 | mineral : tiger-eye agate<br>rock : orange with silky luster, opaque<br>powder : orange with silky luster<br>origin : Africa<br><br>production process:<br>3 g of agate + 40 ml sulphuric acid / soaking: 18 d. / drying on hot plate |
| light grey | 9288 | mineral : amazonite<br>rock : light greenish turquoise<br>powder : white (turquoise reflection)<br>origin : Lac Sairs, Témiscamingue, Québec<br><br>production process:<br>1600 °F / 1 h (medium beige [orange-pink tone]) / rock irradiated with gamma rays at 64.7 Mrad (followed at «light beige-grey [light green reflection]») |
| light grey | 9289 | production process:<br>1 g of amazonite + 1 cc of synthetic white transparent enamel used for the car / manual grinding / application on a piece of steel sheet used for the car's body measuring 1" x 1" (very light grey) / irradiated with gamma rays at 10 Mrad (followed at «brown-grey») |
| light grey | 9290 | mineral : amazonite<br>rock : greenish turquoise<br>powder : white (turquoise reflection)<br>origin : Lac Saint-Jean, Québec<br><br>production process:<br>2 g of amazonite + 20 ml nitric acid / soaking: 3 d. / drying on hot plate (light green): .2 g + 50 cc of transparent polyester resin + 1% of catalyst / manual grinding / moulding / hardening (very, very light grey) / irradiated with electrons at 155,082 rad<br>(followed at «grey [light yellow reflection]») |
| | | mineral : andulusite |

1762

| | | |
|---|---|---|
| light grey | 9291 | rock : light brownish grey<br>powder : light grey<br>origin : Bimbowrie, South Australia<br><br>production process:<br>0↑1900 °F (light beige): 1 g + 50 ml phosphoric acid / soaking: 4 years / drying on hot plate (still humid) |
| light grey | 9292 | production process:<br>0↑1900 °F (light beige): 1 g + 50 ml phosphoric acid / soaking: 2 wk. / drying on hot plate (still humid)[1157] |
| light grey | 9293 | production process:<br>0↑1900 °F (light beige): 1 g + 80 ml phosphoric acid / soaking: 2 wk. / drying on hot plate (still humid) / colour of the solid[1158] |
| light grey | 9294 | mineral : anorthosite<br>rock : light grey<br>powder : very, very light greyish beige<br>origin : rang Sainte-Germaine, Oka, Québec<br><br>production process:<br>2 g of anorthosite + 20 ml sulphuric acid / soaking: 3 d. / drying on hot plate |
| light grey | 9295 | mineral : anorthosite<br>rock : dark grey<br>powder : medium grey<br>origin : Jonquière, Lac Saint-Jean, Québec<br><br>production process:<br>6 g of anorthosite + 50 ml sulphuric acid / soaking: 2 wk. / drying on hot plate |
| light grey<br>↓<br>which evolves towards<br>↓ | 9296<br><br>9297<br>9298<br>9299 | mineral : apatite<br>rock : light grass-green (light blue and yellow tones), very slightly translucid<br>powder : very light grey (light green tone)<br>origin : region of Buckingham, Québec<br><br>production process:<br>2 g of apatite + 2 g of sodium carbonate:<br>0↑1500 °F + 1 h at 1500 °F<br><br>0↑1600 °F + 1 h at 1600 °F<br>0↑1700 °F + 1 h at 1700 °F<br>0↑1800 °F + 1 h at 1800 °F |

| | | |
|---|---|---|
| light beige-grey | 9300 | 0↑1900 °F + 1 h at 1900 °F |
| light grey | 9301 | mineral : apatite<br>rock : pale brownish green<br>powder : very light greyish green<br>origin : Black Lake, Thetford county, Québec<br><br>production process:<br>0↑2000 °F |
| light grey | 9302 | production process:<br>2 g of apatite + 20 ml hydrofluoric acid / soaking: 24 h / drying in drying oven at 100 °F (very light orange[24]): .3 g + 50 cc of transparent polyester resin + 1% of catalyst / manual grinding / moulding / hardening (very, very light orange or beige or grey) / irradiated with electrons at 305,082 rad[354] |
| light grey | 9303 | mineral : apatite<br>rock : pale brownish green<br>powder : very light greyish green<br>origin : Black Lake, Thetford county, Québec<br><br>mineral : nickel<br>powder : dark brownish grey, with metallic brilliance<br><br>production process:<br>1 g of apatite + 1 g of nickel / 2000 °F / 45 min. |
| light grey | 9304 | mineral : apatite<br>rock : light grass-green (light blue and yellow tones), very slightly translucid<br>powder : very light grey (light green tone)<br>origin : region of Buckingham, Québec<br><br>production process:<br>.2 g of apatite + 50 cc of transparent polyester resin + 1% of catalyst / manual grinding / moulding / hardening (very, very light grey [very light green reflection]) / irradiated with electrons at 155,082 rad (followed at «grey [light green reflection]») |
| | | mineral : apatite<br>rock : reddish brown<br>powder : light pinkish beige<br>origin : Calumet, Pontiac county, Québec |

1764

| | | |
|---|---|---|
| light grey | 9305 | production process:<br>3 g of apatite + 20 m hydrochloric acid / soaking: 3 d. / drying on hot plate |
| light grey | 9306 | mineral : apatite<br>rock : dark grass-green (yellow tone), very slightly translucid<br>powder : powder filtered at 14 meshes: very, very light green; powder filtered beneath 14 meshes: light grey (beige tone and greenish reflection)<br>origin : Ile Calumet, Pontiac county, Québec<br><br>mineral : calcite[11]<br>powder : white<br>origin : Calcite du Nord Company, Saint-Eugène de Mistassini, Lac Saint-Jean, Québec<br><br>production process:<br>1 g of apatite + 1 g of calcite / 1000 °C / 1 h |
| light grey<br>↓<br>light grey | 9307<br><br>9308 | mineral : apophyllite<br>rock : milky white, translucid<br>powder : white<br>origin : Gaspé Copper Mine, Gaspé, Québec<br><br>production process:<br>0↑1800 °F<br><br>0↑2000 °F |
| light grey<br>\|<br>light grey<br>\|<br>light grey<br>↓<br>light grey | 9309<br><br>9310<br><br>9311<br><br>9312 | mineral : beryl<br>rock : light blue, slightly translucid<br>powder : light grey<br>origin : Abitibi, Québec<br><br>production process:<br>2 g of beryl + 2 g of sodium carbonate:<br>0↑1300 °F + 1 h at 1300 °F<br><br>0↑1400 °F + 1 h at 1400 °F<br><br>0↑1500 °F + 20 min. at 1500 °F<br><br>0↑1500 °F + 40 min. at 1500 °F<br>(followed at «very light azure-blue») |
| light grey | 9313 | production process:<br>1000 °C / 1 h |
| | | mineral : calcite[11]<br>powder : white |

| | | |
|---|---|---|
| | | origin : Calcite du Nord Company, Saint-Eugène de Mistassini, Lac Saint-Jean, Québec<br><br>mineral : chrome<br>powder : light grey, with metallic brilliance<br><br>production process:<br>1 g of calcite + 1 g of chrome (white) / irradiated with electrons at 302,831 rad[36] |
| light grey | 9314 | |
| | | mineral : calcite[11]<br>powder : white<br>origin : Calcite du Nord Company, Saint-Eugène de Mistassini, Lac Saint-Jean, Québec<br><br>mineral : chromite[294]<br>rock : dark grey<br>powder : dark grey<br>origin : Black Lake, Eastern Townships, Québec<br><br>production process:<br>(followed from «greyish brown») |
| light grey | 9315 | 1.50 g of calcite + .50 g of chromite / 700 °C / 2 h |
| ↓ | | |
| light grey | 9316 | 1.50 g of calcite + .50 g of chromite / 800 °C / 2 h<br>(followed at «light greenish grey») |
| | | mineral : calcite (with clayey inclusions)<br>rock : very light creamy yellow, translucid<br>powder : white<br>origin : De-Mix quarry, near Saint-Philippe de Laprairie, Québec<br><br>production process: |
| light grey | 9317 | rock hermetically wrapped in bread dough / 1600 °F / 1 h (white [slightly translucid]) / rock irradiated with electrons at 164,800 rad<br>(followed at «medium brownish grey») |
| | | mineral : cerite<br>rock : dark brownish grey<br>powder : light grey (light brown tone)<br>origin : Jamestown, Boulder county, Colorado, United States |

1766

| | | |
|---|---|---|
| light grey | 9318 | production process:<br>4 g of cerite + 80 ml phosphoric acid / soaking: 2 wk. / drying on hot plate (still humid) / colour of the solid[1159] |
| | | mineral : chalcocite<br>rock : dark iron-grey (with localized turquoise oxidation)<br>powder : dark iron-grey<br>origin : Butte, Montana, United States |
| light grey | 9319 | production process:<br>2 g of chalcocite + 2 g of sodium carbonate / 1900 °F / 1 h (mixture of particles: beige / brown [with metalized copper particles]) / irradiated with gamma rays at 64.7 Mrad[1160]<br>(followed at «beige [light brown tone]») |
| | | mineral : chalcopyrite<br>powder : dark grey (light green tone)<br>origin : Centre de recherche des Mines Noranda in Montréal, Québec |
| light grey<br>↓ | 9320 | production process:<br>4 g of chalcopyrite + 100 ml sulphuric acid / soaking: 2 wk. / drying on hot plate[1161] |
| grey a bit lighter | 9321 | 4 g of chalcopyrite + 100 ml sulphuric acid / soaking: 3 wk. / drying on hot plate[1161]<br>(followed at «very light yellow») |
| | | mineral : coal<br>rock : black<br>powder : brownish black<br>origin : bank of Saint-Lawrence river, city of Québec, Québec |
| light grey | 9322 | production process:<br>2 g of coal + 20 ml phosphoric acid / soaking: 3 d. / drying on hot plate (still humid) |
| | | mineral : chromite[294]<br>rock : dark grey<br>powder : dark grey<br>origin : Black Lake, Eastern Townships, Québec<br><br>mineral : cement[82]<br>powder : medium cold grey<br>origin : Union des Carrières, Limoilou, Québec |

| | | |
|---|---|---|
| | | <u>production process:</u> |
| | | (followed from «greyish brown») |
| light grey | 9323 | 1.50 g of cement + .50 g of chromite / 700 °C / 2 h |
| ↓ | | |
| grey lighter than «light grey» | 9324 | 1.50 g of cement + .50 g of chromite / 800 °C / 2 h (followed at «light grey [light green tone]») |
| | | mineral : chromite[294] |
| | | rock : dark grey |
| | | powder : dark grey |
| | | origin : Black Lake, Eastern Townships, Québec |
| | | mineral : cement[269] |
| | | powder : medium brownish grey |
| | | origin : CALCO, Charlesbourg, Québec |
| | | <u>production process:</u> |
| | | (followed from «greyish brown») |
| light grey | 9325 | 1.50 g of cement + .50 g of chromite / 700 °C / 2 h |
| ↓ | | |
| grey lighter than «light grey» | 9326 | 1.50 g of cement + .50 g of chromite / 800 °C / 2 h (followed at «light greenish grey») |
| | | mineral : zinc concentrate grilled at 1000 °C ($ZnO-FeO)(SO_4)$ |
| | | powder : reddish brown |
| | | origin : Zinc Electrolytic du Canada Co., Québec |
| | | <u>production process:</u> |
| light grey | 9327 | 4 g of concentrate + 50 ml phosphoric acid / soaking: 4 years / drying on hot plate (still humid) / colour of the liquid[30] |
| | | mineral : cryolite |
| | | rock : white, crystalline and translucid |
| | | powder : white |
| | | origin : Ivigtut, Groenland |
| | | <u>production process:</u> |
| light grey | 9328 | 0↑1600 °F (white [with yellowish areas]) / powder irradiated with electrons at 302,831 rad[36] |
| | | mineral : copper |
| | | rock : reddish brown, with metallic luster |
| | | powder : reddish brown, with metallic luster |
| | | origin : unknown |

1768

| | | |
|---|---|---|
| light grey | 9329 | production process: (followed from «light green») 100 g of copper + 100 ml hydrochloric acid / soaking: 5 months / natural drying (mint-green [malachite-green type]): 2 g + 20 ml phosphoric acid / soaking: 3 d. / drying on hot plate (still humid) / colour of the solid[210,1163] |
| light grey | 9330 | mineral : dolomite<br>rock : white (localized yellow reflection), crystalline and translucid<br>powder : white<br>origin : Bristol district, Pontiac county, Québec<br><br>production process: (followed from «very, very light grey») 2 g of dolomite + 2 g of sodium carbonate / 0↑1400 °F + 1 h at 1400 °F (followed at «orange») |
| light grey | 9331 | production process: 2 g of dolomite + 2 g of sodium carbonate: 1500 °F / 30 min. |
| ↓ light grey | 9332 | 1500 °F / 45 min. |
| ↓ light grey | 9333 | 1500 °F / 1 h |
| cold light grey | 9334 | production process: 2 g of dolomite + 25 ml nitric acid / soaking: 3 d. / drying on hot plate (greyish cream) / irradiated with electrons at 302,831 rad[36] |
| light grey | 9335 | production process: .3 g of dolomite + 50 cc of transparent polyester resin + 1% of catalyst / manual grinding / moulding / hardening (very, very light grey [light yellow reflection]) / irradiated with electrons at 155,082 rad (followed at «Naples yellow») |
| light grey | 9336 | mineral : fluorine<br>rock : colourless<br>powder : colourless<br>origin : unknown<br><br>production process: 0↑2000 °F |

| | | |
|---|---|---|
| light grey | 9337 | <u>production process:</u><br>2 g of fluorine + 25 ml nitric acid / soaking: 24 h / drying on hot plate |
| light grey | 9338 | mineral : fluorine<br>rock : violet and white, translucid<br>powder : very light grey<br>origin : Saint-Lawrence Fluorspar Company, Saint-Lawrence, Newfoundland<br><br><u>production process:</u><br>1 g of fluorine + 1 cc of synthetic white transparent enamel paint used for the car / manual grinding / application on a piece of steel sheet used for the car's body measuring 1" x 1" (light grey) irradiated with gamma rays at 5 Mrad[351,352] (followed at «light greyish cream») |
| light grey | 9339 | mineral : honey grossular garnet<br>rock : light pinkish beige<br>powder : light beige<br>origin : Jeffrey Mine, Asbestos (presently J.-M. Asbestos), Québec<br><br>mineral : sulphur<br>rock : brilliant yellow<br>powder : brilliant yellow<br>origin : unknown<br><br><u>production process:</u><br>1 g of garnet + 2 g of sodium carbonate + 1 g of sulphur / 1600 °F / 1 h |
| light grey | 9340 | mineral : sandstone<br>rock : medium pinkish brown (light violet tone)<br>powder : medium pinkish brown (light violet tone)<br>origin : at the rear of Percé, Gaspésie, Québec<br><br><u>production process:</u><br>4 g of sandstone + 80 ml phosphoric acid / soaking: 2 wk. / drying on hot plate (still humid) / colour of the liquid[154] |
| light grey | 9341 | mineral : halite[41]<br>rock : colourless<br>powder : colourless<br>origin : Seleine Mine, Iles-de-la-Madeleine, Québec<br><u>production process:</u><br>2 g of halite + 2 g of sodium carbonate / 0↑1100 °F + 1 h at 1100 °F<br>(followed at «beige») |

1770

| | | |
|---|---|---|
| | | mineral : kaolin<br>rock : chalk-white (yellow reflection)<br>powder : chalk-white (yellow reflection)<br>origin : Saint-Rémi d'Amherst, Québec |
| light grey | 9342 | production process:<br>4 g of kaolin + 80 ml phosphoric acid / soaking: 2 wk. / drying on hot plate (still humid) / colour of the solid[6] |
| light grey | 9343 | production process:<br>0↑1900 °F (white [light pink reflection]): .20 g + 80 ml phosphoric acid / soaking: 2 wk. / drying on hot plate (still humid) / colour of the liquid[160] |
| | | mineral : labrador<br>rock : blackish grey<br>powder : medium grey<br>origin : Lac Saint-Jean, Québec |
| light grey | 9344 | production process:<br>2 g of labrador + 20 ml sulphuric acid / soaking: 3 d. / drying on hot plate |
| | | mineral : microcline<br>rock : white (grey reflection)<br>powder : white (grey reflection)<br>origin : Buckingham, Québec |
| light grey | 9345 | production process:<br>4 g of microcline + 80 ml phosphoric acid / soaking: 2 wk. / drying on hot plate (still humid) / colour of the solid[6] |
| light grey | 9346 | production process:<br>0↑1900 °F |
| ↓ | | |
| light grey | 9347 | 0↑2000 °F |
| | | mineral : amazon stone<br>rock : light greenish turquoise, translucid<br>powder : white (turquoise reflection)<br>origin : unknown |
| light grey | 9348 | production process:<br>4 g of amazon stone + 40 ml sulphuric acid / soaking: 22 d. / drying on hot plate |
| | | mineral : molybdenite[48] (flakes of $MoS_2$ + pegmatite [quartz + bismuth])<br>rock : transparent and grey<br>powder : medium cold grey |

1771

| | | |
|---|---|---|
| light grey [with blue particles] | 9349 | origin : Lamotte, Abitibi, Québec<br><br>production process:<br>6 g of molybdenite + 50 ml sulphuric acid / soaking: 4 years / drying on hot plate[1179] |
| light grey | 9350 | production process:<br>2 g of molybdenite + 25 ml sulphuric acid / soaking: 3 d. / drying on hot plate |
| light grey | 9350.1 | mineral : bloody agate<br>rock : dark grass-green, translucid<br>powder : light grey (light green tone)<br>origin : India<br><br>production process:<br>1 g of agate + 6.50 g of glass powder (spruce pine batch) / manual grinding / deposited on a ceramic plate at the state of a biscuit / heating in a furnace 0↑1000 °C in ambient air / slow cooling in furnace |
| light grey | 9351 | mineral : ochre[20]<br>powder : orange<br>origin : small copper and nickel deposit, in the South-Western area of a mass of serpentinite at 3 km at the West of Saint-Fabien-de-Panet, Québec<br><br>production process:<br>3 g of ochre + 20 ml hydrofluoric acid / soaking: 24 h / drying in drying oven at 100 °F |
| light grey | 9352 | mineral : olivine<br>rock : light grey, crystalline<br>powder : very light grey<br>origin : Mont Albert, Gaspésie, Québec<br><br>production process:<br>4 g of olivine + 100 ml phosphoric acid / soaking: 4 years / drying on hot plate (still humid) |
| | | mineral : orthoclase<br>rock : white (grey reflection)<br>powder : white (grey reflection)<br>origin : mine near Buckingham, Papineau county, Québec |

| | | |
|---|---|---|
| light grey | 9353 | production process:<br>1600 °F / 1 h |
| light grey | 9354 | production process:<br>rock hermetically wrapped in bread dough / 1600 °F / 1 h (white [beige and grey reflections]) / irradiated with electrons at 305,200 rad[46] |
| light grey | 9355 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>1 g of ochre + 1 g of titanium dioxide / 0↑700 °F (followed at «light grey [pinkish beige tone]») |
| light grey | 9356 | production process:<br>1 g of ochre + 2 g of titanium dioxide / 0↑700 °F (followed at «light grey [pinkish beige tone]») |
| light grey | 9357 | mineral : ochre[128]<br>powder : black<br>origin : Red Mill, in the suburbs of Cap-de-la-Madeleine, Québec<br><br>mineral : titanium dioxide<br>powder : white<br>origin : NL Chem Canada Inc., Québec<br><br>mineral : zirconium silicate<br>powder : white (very light yellow reflection)<br>origin : Sial Company, Québec<br><br>production process:<br>1 g of ochre + 1 g of zirconium silicate + 1 g of titanium dioxide / 0↑700 °F<br>(followed at «light beige-grey [pink tone]») |
| | | mineral : uraninite<br>rock : medium chocolate-brown (red Bordeau tone)<br>powder : medium milky chocolate-brown<br>origin : Yellowknife, Canada |

1773

| | | |
|---|---|---|
| light grey | 9358 | <u>production process:</u><br>0↑1900 °F (medium orange-brown): 1 g + 20 ml phosphoric acid / soaking: 4 years / drying on hot plate (still humid) / colour of the solid[59,1164] |
| light grey | 9359 | mineral : pyrite<br>rock : pale brass-yellow, with metallic brilliance<br>powder : brownish grey (with golden yellow particles)<br>origin : Noranda Mines, Noranda, Abitibi, Québec<br><br><u>production process:</u><br>5 g of pyrite + 20 ml hydrofluoric acid / soaking: 24 h / drying in drying oven at 100 °F |
| light grey | 9360 | mineral : pyrophillite<br>rock : light beige (grey and pink tones), opaque<br>powder : very light beige (grey and orange-pink tones)<br>origin : Carpentier district, Abitibi, Québec<br><br>mineral : sulphur<br>rock : brilliant yellow<br>powder : brilliant yellow<br>origin : unknown<br><br><u>production process:</u><br>2 g of pyrophillite + 2 g of sulphur / 1300 °F / 1h |
| light grey | 9361 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br><u>production process:</u><br>0↑1900 °F (dark iron-grey): 1 g + 80 ml phosphoric acid / soaking: 2 wk. / drying on hot plate (still humid) / colour of the solid[6] |
| light grey, opaque | 9362 | mineral : crystalline quartz<br>rock : colourless<br>origin : Ferme Adam, Bonsecours, Eastern Townships, Québec<br><br><u>production process:</u><br>rock hermetically wrapped in bread dough / 1600 °F / 1 h |

1774

| | | |
|---|---|---|
| light grey | 9362.1 | production process:<br>rock hermetically wrapped in bread dough / -20 °C / 2 h / immediately irradiated while cold with gamma rays at 2.26 Mrad[1278] |
| 2 areas: light grey / light grey-honey | 9363 | mineral : quartz (with impurities of white kaolinite)<br>rock : opaline white, slightly translucid<br>origin : quarry near Saint-Rémi d'Amherst, Québec<br><br>production process:<br>(followed from «white [yellow reflection]»)<br>1500 °F / 1 h (white whiter and a bit more opaque than «opaline white») / rock irradiated with gamma rays at 424.7 Mrad[67,73] |
| light cold grey | 9364 | mineral : milky quartz<br>rock : milky white, translucid<br>origin : Ferme Adam, Bonsecours, Eastern Townships, Québec<br><br>production process:<br>(followed from «brownish grey»)<br>rock irradiated with gamma rays at 287.3 Mrad[1165]<br>(followed at «light greyish brown») |
| light grey | 9365 | production process:<br>1600 °F / 1 h (white whiter and more milky and opaque than «milky translucid white» / rock irradiated with electrons at 305,200 rad[46] |
| light grey | 9366 | mineral : sphalerite[27]<br>rock : dark grey, with golden yellow metallic brilliance<br>powder : dark brownish grey<br>origin : Matagami Mine, Matagami, Québec<br><br>production process:<br>0↑1800 °F (medium chocolate-brown): 1 g + 100 ml phosphoric acid / soaking: 4 years / drying on hot plate (still humid)[1166] |
| light grey | 9367 | production process:<br>4 g of sphalerite + 20 ml phosphoric acid / soaking: 24 h / drying on hot plate (still humid) |
| | | mineral : spodumene<br>rock : pale green |

1775

| | | |
|---|---|---|
| | | powder : light grey, almost white<br>origin : Québec Lithium Co., Baraute, Abitibi, Québec |
| light grey | 9368 | <u>production process:</u><br>0↑1900 °F (medium brownish grey): .30 g + 80 ml phosphoric acid / soaking: 2 wk. / drying on hot plate / colour of the solid[6] |
| light grey | 9369 | <u>production process:</u><br>0↑1900 °F (medium brownish grey): .20 g + 80 ml sulphuric acid / soaking: 2 wk. / drying on hot plate |
| light grey, opaque | 9370 | mineral : steatite<br>rock : cold light grey, slightly translucid<br>powder : light grey<br>origin : East Broughton, Québec<br><u>production process:</u><br>60 g of steatite + 100 ml phosphoric acid / soaking: 3 wk. / drying on hot plate (still humid) / colour of the solid[210] |
| light grey, opaque | 9371 | <u>production process:</u><br>2 g of steatite + 20 ml phosphoric acid / soaking: 3 d. / drying on hot plate (still humid) / colour of the solid[210] |
| light grey | 9372 | <u>production process:</u><br>(followed from «beige [light brown tone]» and «very light beige [creamy beige type]»)<br>0↑1200 °F (grey more accentuated than «light grey»): 2 g + 25 ml nitric acid / soaking: 3 d. / drying on hot plate<br>(followed at «brown-orange») |
| light grey | 9373 | mineral : stibnite<br>rock : dark grey, with metallic brilliance<br>powder : dark grey, with metallic brilliance<br>origin : Hunan, China<br>mineral : chrome<br>powder : light grey, with metallic brilliance<br><u>production process:</u><br>1 g of stibnite + 1 g of chrome / 2000 °F / 45 min.[1167] |
| | | mineral : stibnite<br>rock : dark grey, with metallic brilliance<br>powder : dark grey, with metallic brilliance<br>origin : Hunan, China |

1776

| | | |
|---|---|---|
| light grey | 9374 | mineral : nickel<br>powder : dark brownish grey, with metallic brilliance<br><br>production process:<br>1 g of stibnite + 1 g of nickel / 2000 °F / 45 min. |
| light grey | 9375 | mineral : molybdenite[103]<br>rock : medium grey, with metallic brilliance<br>powder : medium grey, with metallic briliance<br>origin : Anglo American Molybdenite Mine, near Lamotte, Preissiac district, Abitibi, Québec<br><br>production process:<br>(followed from «beige»)<br>powder finely grinded and heated at 900 °F / 1 h<br>(followed at «light Naples yellow») |
| light grey | 9376 | mineral : tremolite<br>rock : medium brown (evergreen tone)<br>powder : greyish beige<br>origin : Tetreault Mine, Montauban, Portneuf county, Québec<br><br>production process:<br>55 g of tremolite + 100 ml phosphoric acid / soaking: 3 wk. / drying on hot plate (still humid) / colour of the solid[30] |
| light grey | 9377 | mineral : tremolite<br>rock : medium brown (evergreen tone)<br>powder : greyish beige<br>origin : Tetreault Mine, Montauban, Portneuf county, Québec<br><br>mineral : zirconium silicate<br>powder : white (very light yellow reflection)<br>origin : Sial Company, Québec<br><br>production process:<br>1 g of tremolite + 1.50 g of sodium carbonate / 1600 °F / 3 h (dark grass-green): .50 g + .50 g of zirconium silicate/ 1600 °F / 1 h<br>(followed at «beige») |
| | | mineral : tremolite<br>rock : medium brown (evergreen tone)<br>powder : greyish beige<br>origin : Tetreault Mine, Montauban, Portneuf county, Québec |

1777

| | | |
|---|---|---|
| | | mineral : sulphur<br>rock : brilliant yellow<br>powder : brilliant yellow<br>origin : unknown<br><br>mineral : titanium dioxide<br>powder : white<br>origin : NL Chem Canada Inc., Québec<br><br>production process:<br>2 g of tremolite + 2 g of titanium dioxide + 1 g of sulphur: |
| light grey | 9378 | 0↑1500 °F |
| light grey | 9379 | 0↑1600 °F |
| light grey | 9380 | 0↑1700 °F<br>(followed at «pale straw-yellow») |
| | | mineral : obsidian<br>rock : very dark smoky grey, almost black<br>powder : light grey<br>origin : Arkansas, United States<br><br>production process:<br>(followed from «orange-brown») |
| light grey | 9381 | 2 g of obsidian + 2 g of sodium carbonate /<br>0↑1500 °F + 15 min. at 1500 °F<br>(followed at «medium brownish grey») |
| light grey | 9382 | production process:<br>2 g of obsidian + 20 ml nitric acid / soaking: 3 d. / drying on hot plate |
| light grey | 9383 | production process:<br>0↑1000 °C |
| | | mineral : obsidian<br>rock : very dark smoky grey, almost black<br>powder : light grey<br>origin : Arkansas, United States<br><br>mineral : sulphur<br>rock : brilliant yellow<br>powder : brilliant yellow<br>origin : unknown<br><br>production process: |
| light grey | 9384 | 2 g of obsidian + 2 g of sulphur / 1300 °F / 1 h |
| | | mineral : calcite[11] |

1778

| | | |
|---|---|---|
| | | powder : white<br>origin : Calcite du Nord Company, Saint-Eugène de Mistassini, Lac Saint-Jean, Québec<br><br>mineral : obsidian<br>rock : very dark smoky grey, almost black<br>powder : light grey<br>origin : Arkansas, United States<br><br>production process: |
| light grey | 9385 | 1 g of calcite + 1 g of obsidian / 1000 °C / 1 h |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process: |
| light grey | 9386 | 0↑1900 °F (light beige-grey): .50 g + 80 ml phosphoric acid / soaking: 2 wk. / drying on hot plate (still humid) / colour of the solid[52] |
| | | production process: |
| light grey | 9387 | 1 g of wilsonite + .25 g of sodium carbonate / 1600 °F / 1 h (followed at «light azure-blue») |
| | | production process:<br>(followed from «very light azure-blue»)<br>4 g of wilsonite + 1 g of potassium carbonate: |
| light grey | 9388 | 0↑1600 °F |
| ↓ | | |
| light grey | 9389 | 0↑1700 °F |
| ↓ | | |
| light grey | 9390 | 0↑1800 °F |
| | | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : sulphur<br>rock : brilliant yellow<br>powder : brilliant yellow<br>origin : unknown |

| | | |
|---|---|---|
| light grey | 9391 | production process:<br>2 g of wilsonite + 2 g of sulphur / 1300 °F / 1 h |
| light grey | 9392 | mineral : zinc<br>powder : medium grey, with metalic brilliance<br><br>production process:<br>5 g of zinc + 20 ml ammonia / natural drying |
| light and intense grey | 9393 | mineral : sericite shale<br>rock : light grey (green reflection)<br>powder : very, very light grey<br>origin : Magog, Québec<br><br>production process:<br>powder irradiated with electrons at<br>302,831 rad[36,228] |
| light grey | 9394 | mineral : fluorine<br>rock : white (pink reflection), translucid<br>powder : white (grey reflection)<br>origin : Saint-Lawrence Fluorspar Company, Saint-Lawrence, Newfoundland<br><br>production process:<br>rock irradiated with gamma rays at:<br>5 Mrad |
| ↓ | | |
| grey a bit darker and more accentuated | 9395 | 10 Mrad |
| ↓ | | |
| grey still a bit darker and more accentuated | 9396 | 57.4 Mrad<br><br>(followed at «light beige») |
| light grey | 9397 | mineral : quartz (with impurities of white kaolinite)<br>rock : opaline white, slightly translucid<br>origin : quarry near Saint-Rémi d'Amherst, Québec<br><br>production process:<br>(followed from «grey or beige tint»)<br>rock irradiated with gamma[332,1168] rays at:<br>64.7 Mrad |
| ↓ | | |
| grey a bit more accentuated | 9398 | 102.4 Mrad |
| ↓ | | |
| grey a bit more accentuated | 9399 | 148.4 Mrad |

| | | |
|---|---|---|
| ↓<br>grey still a bit more accentuated | 9400 | 201.6 Mrad |
| ↓<br>grey still a bit more accentuated | 9401 | 247.6 Mrad[1169] |
| ↓<br>grey still a bit more accentuated | 9402 | 287.3 Mrad<br>(followed at «beige-grey») |
| grey a bit more accentuated than «light grey» | 9403 | mineral : beryl<br>rock : light blue, slightly translucid<br>powder : light grey<br>origin : Abitibi, Québec<br><br>production process:<br>2 g of beryl + 2 g of sodium carbonate / 0↑1700 °F + 1 h at 1700 °F (bluish turquoise more accentuated than «light bluish turquoise») / irradiated with electrons at 302,831 rad[36] |
| grey a bit more accentuated than «light grey» | 9404 | mineral : spodumene<br>rock : pale green<br>powder : light grey, almost white<br>origin : Québec Lithium Co., Baraute, Abitibi, Québec<br><br>production process:<br>powder irradiated with electrons at 302,831 rad[36] |
| grey more accentuated than «light grey» | 9405 | mineral : steatite<br>rock : cold light grey, slightly translucid<br>powder : light grey<br>origin : East Broughton, Québec<br><br>production process:<br>0↑1200 °F |
| ↓<br>grey still more accentuated | 9406 | 0↑1250 °F<br>(followed at «grey [light brown tone]») |
| | | mineral : dolomite<br>rock : light grey<br>powder : light grey<br>origin : Shefferville, Ungava, Québec |

| | | |
|---|---|---|
| | | production process:<br>rock irradiated with gamma rays at: |
| grey a bit darker than «light grey» | 9407 | 5 Mrad |
| grey still a bit darker | 9408 | 10 Mrad |
| grey still a bit darker | 9409 | 57.4 Mrad |
| grey still a bit darker | 9410 | 63.984 Mrad |
| | | mineral : olivine<br>rock : light grey, crystalline<br>powder : very light grey<br>origin : Mont Albert, Gaspésie, Québec |
| grey darker and a bit more intense than «light grey» | 9411 | production process:<br>.3 g of olivine + 50 cc of transparent polyester resin + 1% of catalyst / manual grinding / moulding / hardening (light grey) / irradiated with electrons at 305,082 rad[354] |
| | | mineral : sericite shale<br>rock : light grey (green reflection)<br>powder : very, very light grey<br>origin : Magog, Québec |
| | | production process:<br>powder irradiated with gamma rays at: |
| light grey | 9412 | 5 Mrad |
| grey a bit darker | 9413 | 10 Mrad<br>(followed at «beige-grey») |
| | | mineral : halite[41]<br>rock : colourless<br>powder : colourless<br>origin : Seleine Mine, Iles-de-la-Madeleine, Québec |
| | | production process:<br>rock irradiated with neutrons at $10^{12}$ neutrons / $cm^2$ / sec. during: |
| light grey | 9414 | 300 seconds |
| darker grey | 9415 | 600 seconds |
| grey still darker | 9416 | 1,000 seconds<br>(followed at «dark grey») |

| | | |
|---|---|---|
| grey very lightly darker than «light grey» | 9417 | mineral : fluorine<br>rock : violet and white, translucid<br>powder : very light grey<br>origin : Saint-Lawrence Fluorspar Company, Saint-Lawrence, Newfoundland<br><br>production process:<br>1 g of fluorine + 1 cc of white transparent printing ink / mechanical grinding / 8 superimpositions on white glazed paper (light grey) / irradiated with gamma rays at 5.7 Mrad[649] |
| grey a bit darker than «light grey» | 9418 | mineral : tiger-eye agate<br>rock : orange with silky luster, opaque<br>powder : orange with silky luster<br>origin : Africa<br><br>production process:<br>3 g of agate + 40 ml sulphuric acid / soaking: 18 d. / drying on hot plate (light grey) / irradiated with gamma rays at 65.65 Mrad<br>(followed at «medium beige») |
| grey a bit darker than «light grey» | 9419 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>powder irradiated with gamma rays at 65.704 Mrad<br>(followed at «medium lemon-yellow») |
| | | mineral : anorthosite<br>rock : light grey<br>powder : very, very light greyish beige<br>origin : rang Sainte-Germaine, Oka, Québec<br><br>production process:<br>rock irradiated with gamma rays at: |
| grey a bit darker than «light grey» | 9420 | 5 Mrad |
| \| | | |
| grey a bit darker and more accentuated | 9421 | 10 Mrad |
| \| | | |
| grey still a bit darker and more | 9422 | 57.4 Mrad |

1783

| | | |
|---|---|---|
| accentuated<br>↓<br>grey still a bit darker and more accentuated | 9423 | 65.704 Mrad<br>(followed at «light orange-beige») |
| grey a bit darker than «light grey» | 9424 | mineral : olivine<br>rock : light grey, crystalline<br>powder : very light grey<br>origin : Mont Albert, Gaspésie, Québec<br><br><u>production process:</u><br>rock irradiated with electrons at<br>164,800 rad |
| grey a bit darker than «light grey» | 9425 | mineral : obsidian<br>rock : very dark smoky grey, almost black<br>powder : light grey<br>origin : Arkansas, United States<br><br><u>production process:</u><br>powder[1170] irradiated with gamma rays at:<br>55 Mrad |
| ↓<br>grey still a bit darker | 9426 | 64.7 Mrad<br>(followed at «grey [light brown tone with green or blue reflection]») |
| grey still a bit darker than «light grey» | 9427 | <u>production process:</u><br>powder[1170] irradiated with electrons at<br>302,831 rad[36] |
| grey a bit more | 9428 | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec<br><br>mineral : cement[1138]<br>powder : white<br><br><u>production process:</u><br>.50 g of iron sulphide - nickel + 4.50 g of cement + 3 cc of water / manual grinding / moulding / hardening (light grey):<br>0↑700 °F |

| | | |
|---|---|---|
| dark than «light grey» | | |
| grey a bit darker | 9429 | 0↑800 °F |
| grey still a bit darker | 9430 | 0↑900 °F |
| grey still a bit darker | 9431 | 0↑1000 °F<br>(followed at «very pale beige») |
| grey much darker than «light grey» | 9432 | mineral : steatite<br>rock : light cold grey, slightly translucid<br>powder : light grey<br>origin : East Broughton, Québec<br><br>production process:<br>rock hermetically wrapped in bread dough / irradiated with gamma rays at 5.7 Mrad[171] |
| grey much darker than «light grey» | 9433 | mineral : apophyllite<br>rock : milky white, translucid<br>powder : white<br>origin : Gaspé Copper Mine, Gaspé, Québec<br><br>production process:<br>0↑2000 °F (light grey) / powder irradiated with gamma rays at 64.7 Mrad<br>(followed at «medium and accentuated pearly grey [light orange-beige tone]») |
| grey lighter and colder than «grey» | 9434 | mineral : goethite<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «brownish grey» and «dark violet [accentuated brown tone]»)<br>0↑1400 °F / slow cooling in furnace (indian red[107]):<br>2 g + 6 g of sulphur / 1700 °F / 1 h<br><br>(followed at «grey of various tones») |

| | | |
|---|---|---|
| | | (followed from «dark violet [accentuated brown tone]») |
| grey still lighter | 9435 | 2 g + 12 g of sulphur / 1700 °F / 1 h (followed at «grey of various tones») |
| | | (followed from «dark violet [accentuated brown tone]») |
| ↓ grey still lighter | 9436 | 2 g + 24 g of sulphur / 1700 °F / 1 h (followed at «grey of various tones») |
| grey | 9437 | mineral : Gaspé agate<br>rock : marbled nodule with shaded tints of white, pink and light grey, slightly translucid<br>powder : very light pinkish grey<br>origin : Mont Lyall, Gaspésie, Québec<br><br>production process:<br>4 g of agate + 40 ml phosphoric acid / soaking: 2 wk. / drying on hot plate (still humid) / colour of the solid[9,1172] |
| grey | 9438 | mineral : blue lace agate<br>rock : light blue (violet tone), slightly translucid<br>powder : very light grey<br>origin : Africa<br><br>production process:<br>3 g of agate + 40 ml phosphoric acid / soaking: 2 wk. / drying on hot plate (still humid) / colour of the solid[210,1173] |
| grey | 9439 | mineral : sardonyx<br>rock : white, slightly translucid (with a light orange-amber circular area on the surface)<br>powder : very light grey<br>origin : unknown<br><br>production process:<br>4 g of sardonyx + 40 ml phosphoric acid / soaking: 2 wk. / drying on hot plate (still humid) / colour of the solid[9,1174] |
| | | mineral : agate<br>rock : dark grass-green, slightly translucid<br>powder : light grey (light green tone)<br>origin : bank of Saint-Lawrence river, region of Maria, Gaspésie, Québec |

1786

| | | |
|---|---|---|
| | | production process: |
| | | 2 g of agate + 2 g of sodium carbonate: |
| grey | 9440 | 0↑1400 °F + 1 h at 1400 °F |
| grey | 9441 | 0↑1500 °F + 1 h at 1500 °F |
| grey | 9442 | 0↑1600 °F + 1 h at 1600 °F |
| grey ↓ | 9443 | 0↑1700 °F + 1 h at 1700 °F |
| | | (followed at «emerald-green») |
| | | mineral : andulusite |
| | | rock : light brownish grey |
| | | powder : light grey |
| | | origin : Bimbowrie, South Australia |
| | | production process: |
| grey | 9444 | 0↑1900 °F (light beige): 1 g + 50 ml sulphuric acid / soaking: 2 wk. / drying on hot plate |
| | | mineral : anorthosite |
| | | rock : light grey |
| | | powder : very, very light greyish beige |
| | | origin : rang Sainte-Germaine, Oka, Québec |
| | | production process: |
| | | (followed from «medium grey [very light green tone]») |
| grey [with blue particles] | 9445 | 2 g of anorthosite + 2 g of sodium carbonate / 0↑1500 °F + 15 min. at 1500 °F |
| | | (followed at «intense azure-blue») |
| | | mineral : apatite |
| | | rock : pale brownish green |
| | | powder : very light greyish green |
| | | origin : Black Lake, Thetford county, Québec |
| | | production process: |
| grey | 9446 | 2 g of apatite + 25 ml sulphuric acid / soaking: 24 h / drying on hot plate |
| | | mineral : apatite |
| | | rock : medium brownish red |
| | | powder : light pinkish beige |
| | | origin : Ile Calumet, Pontiac county, Québec |
| | | production process: |
| | | (followed from «brownish grey») |
| | | 2 g of apatite + 2 g of sodium carbonate: |
| grey | 9447 | 0↑1500 °F + 1 h at 1500 °F |
| grey | 9448 | 0↑1600 °F + 1 h at 1600 °F |

1787

| | | |
|---|---|---|
| grey ↓ | 9449 | 0↑1700 °F + 1 h at 1700 °F<br>(followed at «beige-grey») |
| grey | 9450 | mineral : bornite<br>rock : reddish brown (with localized green and bluish green oxidation)<br>powder : reddish brown<br>origin : Lac Musset, Fosse du Labrador, Québec<br><br>production process:<br>12 g of bornite + 40 ml phosphoric acid / soaking: 3 h / separation of the liquid (1st) and the solid / addition of 40 ml phosphoric acid to the same solid / soaking: 2 wk. / separation of the liquid and the solid / drying on hot plate (still humid) / colour of the solid[1175] |
| | | mineral : copper<br>rock : reddish brown, with metallic luster<br>powder : reddish brown, with metallic luster<br>origin : unknown<br><br>production process:<br>(followed from «grey [light blue tone]»)<br>100 g of copper + 100 ml hydrochloric acid / soaking: 5 months / drying on hot plate (fairly pronounced greenish turquoise): |
| grey | 9451 | 0↑600 °F |
| which darkens | 9452 | 0↑650 °F |
| | 9453 | 0↑700 °F |
| ↓ progressively | 9454 | 0↑800 °F<br>(followed at «black») |
| | | production process:<br>(followed from «greyish blue»)<br>100 g of copper + 100 ml hydrochloric acid / soaking: 5 months / drying on hot plate (fairly pronounced greenish turquoise): |
| grey | 9455 | 0↑600 °F (grey): .50 g + 5 ml ammonia / natural drying |
| grey a bit darker than «grey» | 9456 | 0↑650 °F (grey darker than «grey»): .50 g + 5 ml ammonia / natural drying |
| grey still a bit darker | 9457 | 0↑700 °F (still darker grey): .50 g + 5 ml ammonia / natural drying |
| ↓ grey still a bit | 9458 | 0↑800 °F (still darker grey): .50 g + 5 ml ammonia |

| | | |
|---|---|---|
| darker | | / natural drying<br>(followed at «black») |
| | | production process:<br>(followed from «greenish turquoise [light grey tone]»)<br>100 g of copper + 100 ml hydrochloric acid / soaking: 5 months / natural drying (mint-green [malachite-green type]): |
| grey | 9459 | 0↑650 °F (mint-green darker than «mint-green»): .50 g + 5 ml ammonia / natural drying |
| grey | 9460 | 0↑675 °F (mint-green still darker [brown] than «mint-green»): .50 g + 5 ml ammonia / natural drying |
| grey | 9461 | 0↑700 °F (mint-green still darker [brown] than «mint-green»): .50 g + 5 ml ammonia / natural drying |
| grey | 9462 | 0↑800 °F (mint-green still darker [brown] than «mint-green»): .50 g + 5 ml ammonia / natural drying |
| grey ↓ | 9463 | 0↑1000 °F (dark mint-green [brown tone]): .50 g + 5 ml ammonia / natural drying |
| grey | 9464 | mineral : coal<br>rock : black<br>powder : brownish black<br>origin : bank of Saint-Lawrence river, city of Québec, Québec<br><br>production process:<br>2 g of coal + 2 g of sodium carbonate / 0↑1300 °F + 1 h at 1300 °F<br>(followed at «beige») |
| grey | 9465 | mineral : chromite[294]<br>rock : dark grey<br>powder : dark grey<br>origin : Black Lake, Eastern Townships, Québec<br><br>mineral : cement[1138]<br>powder : white<br><br>production process:<br>1 g of chromite + 27.40 g of cement + 13 cc of water / manual grinding / moulding / hardening / 0↑1600 °F<br>(followed at «grey [localized grass-green tone]») |
| | | mineral : copper concentrate (Cu-FeS)<br>powder : medium chocolate-brown (grey tone) |

1789

| | | |
|---|---|---|
| | | origin : Centre de recherche des Mines Noranda in Montréal, Québec<br><br>production process:<br>(followed from «brown»)<br>2 g of concentrate + 2 g of sodium carbonate: |
| grey | 9466 | 0↑1700 °F + 1 h at 1700 °F |
| grey ⋮ | 9467 | 0↑1800 °F + 1 h at 1800 °F |
| grey ↓ | 9468 | 0↑1900 °F + 1 h at 1900 °F |
| grey | 9469 | mineral : epidote<br>rock : green (light brown tone [olive-green type])<br>powder : grey (greenish brown tone)<br>origin : Deloro Road, Madoc, Ontario<br><br>production process:<br>12 g of epidote + 40 ml phosphoric acid / soaking: 2 wk. / drying on hot plate (still humid) / colour of the solid[30,1176] |
| grey | 9470 | mineral : fluorine<br>rock : violet and white, translucid<br>powder : very light grey<br>origin : Saint-Lawrence Fluorspar Company, Saint-Lawrence, Newfoundland<br><br>production process:<br>2 g of fluorine + 20 ml hydrochloric acid / soaking: 3 d. / drying on hot plate (milky white [pink reflection]) / irradiated with gamma rays at 18.85 Mrad<br>(followed at «very, very light pink-lilac [grey tone] or very, very light grey [lilac pink tone]») |
| grey | 9471 | mineral : galena<br>rock : dark grey, with metallic brilliance<br>powder : dark grey, with metallic brilliance<br>origin : Trail, British Columbia<br><br>production process:<br>(followed from «brownish green» [stainless steel])<br>4 g of galena powder deposited on a piece of aluminium measuring 1" x 1" / 1400 °F / 1 h / slow cooling in furnace[280]<br>(followed at «brown» [brass - galvanized sheet] and «black» [copper - black plate]) |
| grey / brown / | 9472 | production process:<br>1 g of galena + 1 g of sodium carbonate / grinded |

| | | |
|---|---|---|
| green | | and distributed in the covers of porcelain crucibles / 0↑1300 °F[1177]<br>(followed at «apple-green») |
| grey | 9473 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «dark metallic grey [brown tone]»)<br>10 g of galena powder + 10 g of sulphur / grinded and distributed in 8 covers of porcelain crucibles / 0↑1300 °F<br>(followed at «black») |
| marbled grey, mat | 9474 | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 15 g<br>powder : light grey<br>origin : East Broughton, Québec<br><br>production process:<br>(followed from «orange-beige» and «mat brownish grey»)<br>4 g of galena powder are deposited on a steatite stick / 1500 °F / 1 h (glaze: «orange» on steatite: «golden beige» at its surface and «dark iron-grey» at its depth) / irradiated with gamma rays at 424.7 Mrad / colour of the glaze (followed at «brown», at «dark brownish grey» and «iron-grey darker than "dark iron-grey"») |
| grey | 9475 | mineral : goethite<br>powder : rusty orange<br>origin : Red Mill, in the suburbs of Cap-de-la-Madeleine, Québec<br><br>production process:<br>1 g of goethite + 1 g of Al / 0↑1600 °F |
| | | mineral : goethite<br>powder : rusty orange |

| | | |
|---|---|---|
| | | origin : Red Mill, in the suburbs of Cap-de-la-Madeleine, Québec |
| | | mineral : sulphur<br>rock : brilliant yellow<br>powder : brilliant yellow<br>origin : unknown |
| | | <u>production process:</u><br>(followed from «grey lighter than "grey"» and «brownish grey»)<br>0↑1400 °F / slow cooling in furnace (indian red[107]): |
| grey of various tones | 9476 | 2 g + 2 g of sulphur / 1800 °F / 30 min. |
| | | (followed from «grey lighter and colder than "grey"») |
| | 9477 | 2 g + 6 g of sulphur / 1800 °F / 1 h |
| | | (followed from «grey lighter and colder than "grey"») |
| | 9478 | 2 g + 12 g of sulphur / 1800 °F / 1 h |
| | | (followed from «grey lighter and colder than "grey"») |
| | 9479 | 2 g + 24 g of sulphur / 1800 °F / 1 h |
| | 9480 | 2 g + 2 g of sulphur / 1900 °F / 30 min. |
| | 9481 | 2 g + 6 g of sulphur / 1900 °F / 1 h |
| | 9482 | 2 g + 12 g of sulphur / 1900 °F / 1 h |
| ↓ | 9483 | 2 g + 24 g of sulphur / 1900 °F / 1 h |
| | | mineral : almandite<br>rock : dark brownish red<br>powder : medium brownish red<br>origin : Gore Mountain, Warren county, state of New York, United States |
| | | <u>production process:</u> |
| grey | 9484 | 4 g of almandite + 50 ml sulphuric acid / soaking: 2 wk. / separation of the liquid and the solid / drying on hot plate / colour of the solid (followed at «very, very pale green [almost white]») |
| | | mineral : gypsum<br>rock : white (yellow reflection)<br>powder : white (yellow reflection)<br>origin : Geisborough, Nova Scotia |

1792

| | | |
|---|---|---|
| grey | 9485 | production process:<br>2 g of gypsum + 2 g of sodium carbonate / 0↑1900 °F + 1 h at 1900 °F (chalk-white) / irradiated with gamma rays at 64.7 Mrad (followed at «mixture of particles: white / beige / iron-grey») |
| grey | 9486 | mineral : halite[41]<br>rock : colourless<br>powder : colourless<br>origin : Seleine Mine, Iles-de-la-Madeleine, Québec<br><br>production process:<br>rock entirely covered with 20 ml hydrochloric acid / soaking: 2 wk. / irradiated with gamma rays at 5.7 Mrad / drying on sand bath, completed on hot plate[1178] |
| grey | 9487 | mineral : hornblende<br>rock : medium evergreen (light grey tone), with a vitreous brilliance<br>powder : medium cold grey (light green tone)<br>origin : Abitibi, Québec<br><br>production process:<br>3 g of hornblende + 20 ml ether / natural drying |
| grey | 9488 | production process:<br>3 g of hornblende + 20 ml ammonia / natural drying |
| grey | 9489 | mineral : labradorite<br>rock : bluish green<br>powder : light grey (light green tone)<br>origin : Chicoutimi county, Québec<br><br>production process:<br>2 g of labradorite + 25 ml sulphuric acid / soaking: 24 h / drying on hot plate |
| grey | 9490 | mineral : microcline<br>rock : white (grey reflection)<br>powder : white (grey reflection)<br>origin : Buckingham, Québec<br><br>production process:<br>2 g of microcline + 2 g of sodium carbonate / 0↑1500 °F + 1 h at 1500 °F (light bluish green) / irradiated with electrons at 162,431 rad |

| | | |
|---|---|---|
| grey | 9491 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>0↑1900 °F (dark iron-grey): .50 g + 80 ml phosphoric acid / soaking: 2 wk. / drying on hot plate (still humid) / colour of the solid[59] |
| grey | 9492 | mineral : smaltite[25], variety of skutterudite<br>rock : dark iron-grey, with silver metallic brilliance<br>powder : dark grey<br>origin : Cobalt, Ontario<br><br>production process:<br>3 g of smaltite + 80 ml hydrochloric acid / soaking: 4 years / drying on hot plate / colour of the solid[54,1180] |
| grey | 9493 | mineral : stibnite<br>rock : dark grey, with metallic brilliance<br>powder : dark grey, with metallic brilliance<br>origin : Hunan, Chine<br><br>production process:<br>5 g of stibnite + 20 ml nitric acid / soaking: 3 d. / drying on hot plate[1181] |
| grey | 9494 | mineral : nickel sulphide<br>rock : dark grey<br>powder : dark grey<br>origin : Sudbury, Ontario<br><br>production process:<br>4 g of nickel sulphide + 25 ml hydrochloric acid / starts bubbling as soon as mineral is deposited in acid / immediately after the bubbling, separation of the liquid and the solid / natural drying / colour of the solid<br>(followed at «very intense apple-green [acute green tone]») |
| grey | 9495 | production process:<br>4 g of nickel sulphide + 25 ml sulphuric acid / soaking: 24 h / separation of the liquid and the solid / drying on hot plate / colour of the solid[59] |

| | | |
|---|---|---|
| grey | 9496 | mineral : iron sulphide - nickel[353]<br>rock : medium greyish green<br>powder : light grey (light green tone)<br>origin : small copper and nickel deposit in the South-Western area of a mass of serpentinite at 3 km at the West of Saint-Fabien-de-Panet, Québec<br><br>production process:<br>450 °F / 10 min.<br>(followed at «grey lighter than "light grey"») |
| grey | 9497 | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><br>production process:<br>1 g of vesuvianite + 1 g of sulphur / 1700 °F / 1 h |
| grey a bit darker than «grey» | 9498 | mineral : almandite<br>rock : dark brownish red<br>powder : medium brownish red<br>origin : Gore Mountain, Warren county, state of New York, United States<br><br>production process:<br>4 g of almandite + 50 ml sulphuric acid / soaking: 2 wk. / separation of the liquid and the solid / drying on hot plate (colour of the solid: grey) / irradiated with gamma rays at 70.4 Mrad<br>(followed at «mixture of particles: dark beige / brownish red / brownish pink») |
| grey a bit more pale than «medium grey» and colder [less brown, more grey] | 9499 | mineral : cement[82]<br>powder : medium cold grey<br>origin : Union des Carrières, Limoilou, Québec<br><br>production process:<br>irradiated with electrons at 302,831 rad[36] |

1795

| | | |
|---|---|---|
| grey a bit lighter than «medium grey» | 9500 | <u>production process:</u><br>4 g of cement + 20 ml hydrofluoric acid / soaking: 24 h / drying in drying oven at 100 °F |
| grey colder and a bit lighter than «medium grey» | 9501 | mineral : anorthosite<br>rock : dark grey<br>powder : medium grey<br>origin : Jonquière, Lac Saint-Jean, Québec<br><br><u>production process:</u><br>(followed at «grey a bit more accentuated than "medium grey"»)<br>powder irradiated with electrons at 302,831 rad[45] |
| | | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u><br>1 g of fluorine + 1 cc of synthetic white transparent enamel paint used for the car / manual grinding / application on a piece of steel sheet used for the car's body measuring 1" x 1" (greyish beige) / irradiated with gamma rays at: |
| grey a bit lighter than «medium grey» | 9502 | 5 Mrad[1184] |
| ↓ | | |
| grey a bit lighter than «medium grey» | 9503 | 7.54 Mrad |
| ↓ | | |
| grey a bit more intense | 9504 | 10 Mrad |
| ↓ | | |
| grey a bit more intense | 9505 | 15.08 Mrad |
| ↓ | | |
| grey still a bit more intense | 9506 | 18.85 Mrad<br>(followed at «light beige») |
| | | mineral : asbestos[4]<br>rock : dark grey (green reflection)<br>powder : light grey (green reflection)<br>origin : Asbestos Corporation Ltd., Thetford Mines, Québec |

1796

| | | |
|---|---|---|
| medium grey | 9507 | production process:<br>15 g of asbestos + 100 ml phosphoric acid / soaking: 3 wk. / separation of the liquid and the solid / drying on hot plate (still humid) / colour of the solid[210] |
| medium grey | 9508 | mineral : andulusite<br>rock : light brownish grey<br>powder : light grey<br>origin : Bimbowrie, South Australia<br><br>production process:<br>4 g of andulusite + 80 ml phosphoric acid / soaking: 2 wk. / drying on hot plate (still humid) / colour of the solid[6] |
| medium grey | 9509 | mineral : anorthosite<br>rock : dark grey<br>powder : medium grey<br>origin : Jonquière, Lac Saint-Jean, Québec<br><br>mineral : sulphur<br>rock : brilliant yellow<br>powder : brilliant yellow<br>origin : unknown<br><br>production process:<br>1 g of anorthosite + 1.50 g of sodium carbonate + 1 g of sulphur / 1700 °F / 1 h |
| medium grey | 9510 | mineral : apatite<br>rock : pale brownish grey<br>powder : very light greyish green<br>origin : Black Lake, Thetford county, Québec<br><br>mineral : chrome<br>powder : light grey, with metallic brilliance<br><br>production process:<br>1 g of apatite + 1 g of chrome / 2000 °F / 45 min. |
| medium grey | 9511 | mineral : beryl<br>rock : intense grass-green slightly translucid<br>powder : greenish grey<br>origin : unknown<br><br>production process:<br>1 g of beryl + 1 g of sodium carbonate / 1600 °F / 1 h |

| | | |
|---|---|---|
| | | mineral : chalcocite<br>rock : dark iron-grey (with localized turquoise oxidation)<br>powder : dark iron-grey<br>origin : Butte, Montana, United States |
| medium grey | 9512 | production process:<br>4 g of chalcocite + 100 ml phosphoric acid / soaking: 2 wk. / drying on hot plate (still humid) / colour of the liquid[160] |
| | | mineral : cement[82]<br>powder : medium cold grey<br>origin : Union des Carrières, Limoilou, Québec |
| | | production process: |
| medium cold grey | 9513 | 0↑1000 °F |
| whitened grey | 9514 | 0↑1300 °F |
| grey still more whitened | 9515 | 0↑1800 °F |
| ↓ grey still more whitened | 9516 | 0↑2000 °F[1185] |
| | | mineral : galena<br>rock : dark grey, with metallic brilliance<br>powder : dark grey, with metallic brilliance<br>origin : Trail, British Columbia |
| medium grey | 9517 | production process:<br>powder heated at 1300 °F / 1 h[1185a] |
| medium grey | 9518 | production process:<br>galena powder entirely covered with nitric acid / soaking: 24 h / drying on hot plate |
| medium cold grey | 9519 | production process:<br>120 g of galena + 300 ml phosphoric acid / soaking: 3 wk. / drying on hot plate (still humid) |
| | | mineral : almandite<br>rock : dark brownish red<br>powder : medium brownish red<br>origin : Gore Mountain, Warren county, state of New York, United States |
| medium grey | 9520 | production process:<br>4 g of almandite + 50 ml phosphoric acid / soaking: 2 wk. / drying on hot plate (still humid) / |

| | | |
|---|---|---|
| | | colour of the solid[9] |
| medium grey | 9521 | mineral : ochre[98]<br>powder : yellow<br>origin : small copper and nickel deposit in the South-Western area of a mass of serpentinite at 3 km at the West of Saint-Fabien-de-Panet, Québec<br><br>production process:<br>35 g of ochre + 100 ml phosphoric acid / soaking: 3 wk. / drying on hot plate (still humid) |
| medium grey | 9522 | mineral : sericite shale<br>rock : light grey (green reflection)<br>powder : very, very light grey<br>origin : Magog, Québec<br><br>production process:<br>2 g of shale + 20 ml phosphoric acid / soaking: 3 d. / drying on hot plate (still humid) |
| medium grey | 9523 | mineral : sphalerite[27]<br>rock : dark brown, with silver metallic brilliance<br>powder : dark brownish grey<br>origin : Louvem Mine, near Val d'Or, Québec<br><br>production process:<br>4 g of sphalerite + 20 ml sulphuric acid / soaking: 3 d. / drying on hot plate |
| medium grey | 9524 | mineral : steatite<br>rock : light cold grey, slightly translucid<br>powder : light grey<br>origin : East Broughton, Québec<br><br>production process:<br>2 g of steatite + 20 ml hydrofluoric acid / soaking: 24 h / drying in drying oven at 100 °F / colour of the solid[1187] |
| | | mineral : tremolite<br>rock : medium brown (evergreen tone)<br>powder : greyish beige<br>origin : Tetreault Mine, Montauban, Portneuf county, Québec<br><br>mineral : sulphur<br>rock : brilliant yellow<br>powder : brilliant yellow |

| | | |
|---|---|---|
| medium grey | 9525 | origin : unknown<br><br>production process:<br>1 g of tremolite + 1.50 g of sodium carbonate / 1600 °F / 8 h (very dark grass-green): .50 g + .50 g of sulphur (pale greenish yellow) / 1600 °F / 1 h |
| grey a bit more accentuated than «medium grey» | 9526 | mineral : anorthosite<br>rock : dark grey<br>powder : medium grey<br>origin : Jonquière, Lac Saint-Jean, Québec<br><br>production process:<br>powder irradiated with electrons at 162,431 rad<br>(followed at «grey colder and a bit lighter than "medium grey"») |
| grey more accentuated than «medium grey» | 9527 | mineral : limestone<br>rock : medium grey<br>origin : region of Montréal, Québec<br><br>production process:<br>rock irradiated with electrons at 164,800 rad |
| grey more accentuated than «medium grey» | 9528 | mineral : corundum<br>rock : medium grey<br>powder : light grey<br>origin : Transvaal, Africa<br><br>production process:<br>rock irradiated with electrons at 164,800 rad |
| grey more accentuated than «medium grey» | 9529 | mineral : steatite<br>rock : light cold grey, slightly translucid; stick measuring 1/2" x 4 7/8" x 1/8" and weighing 15 g<br>powder : light grey<br>origin : East Broughton, Québec<br><br>production process:<br>rock heated 0↑1000 °F<br>(followed at «beige [golden yellow tone with grey reflection]») |
| | | mineral : shale (formation of Sillery)<br>rock : medium cold grey |

1800

| | | |
|---|---|---|
| cold grey much more accentuated than «medium grey» | 9530 | origin : city of Québec, Québec<br><br>production process:<br>rock irradiated with gamma rays at 124.704 Mrad[433]<br>(followed at «dark chocolate-brown») |
| grey a bit darker than «medium grey» | 9531 | mineral : fluorine<br>rock : violet and white, translucid<br>powder : very light grey<br>origin : Saint-Lawrence Fluorspar Company, Saint-Lawrence, Newfoundland<br><br>production process:<br>1 g of fluorine + 1 cc of white transparent printing ink / mechanical grinding / 10 superimpositions on white glazed paper (medium grey) / irradiated with gamma rays at 5.7 Mrad[649] |
| grey a bit darker than «medium grey» | 9532 | mineral : galena<br>rock : dark grey, with metallic brilliance<br>powder : dark grey, with metallic brilliance<br>origin : Trail, British Columbia<br><br>production process:<br>1300 °F / 1 h (medium grey) / powder irradiated with gamma rays at 63.984 Mrad<br>(followed at «greyish brown lighter than "medium greyish brown"») |
| grey a bit darker than «medium grey»<br>↓<br>grey still a bit darker | 9533<br><br>9534 | mineral : peridotite<br>rock : medium grey<br>powder : medium brownish grey (green reflection)<br>origin : Thetford Mines, Québec<br><br>production process:<br>rock irradiated with gamma[228] rays at:<br>5 Mrad<br><br>10 Mrad<br>(followed at «brownish grey darker than "medium brownish grey"») |
| cold grey a bit darker than «medium grey» | 9535 | mineral : shale (formation of Sillery)<br>rock : medium cold grey<br>origin : city of Québec, Québec<br><br>production process:<br>rock irradiated with electrons at 164,800 rad |

| | | |
|---|---|---|
| grey darker than «medium grey» | 9537 | mineral : beryl<br>rock : intense grass-green<br>powder : greenish grey<br>origin : unknown<br><br>production process:<br>3 g of beryl + 40 ml sulphuric acid / soaking: 18 d. / drying on hot plate (medium brownish grey [with «cobalt-blue» particles])[714a] / irradiated with electrons at 164,800 rad |
| grey much darker than «medium grey» | 9538 | mineral : limestone<br>rock : medium grey<br>origin : region of Montréal, Québec<br><br>production process:<br>rock irradiated with gamma rays at 122.984 Mrad[509]<br>(followed at «dark chocolate-brown») |
| grey much darker than «medium grey» | 9539 | mineral : cinnabar<br>rock : medium grey (with red spots on the surface)<br>origin : unknown<br><br>production process:<br>rock irradiated with gamma rays at 5 Mrad[1188]<br>(followed at «medium brownish grey») |
| grey much more pale and cold than «dark grey» | 9540 | mineral : smaltite[25], variety of skutterudite<br>rock : dark iron-grey, with silver metallic brilliance<br>powder : dark grey<br>origin : Cobalt, Ontario<br><br>production process:<br>powder irradiated with gamma rays at 64.7 Mrad (followed at «brownish grey a bit more pale than "dark brownish grey"») |
| grey a bit more pale than «dark grey» | 9541 | production process:<br>2 g of smaltite + 2 g of sodium carbonate / 0↑1900 °F + 1 h at 1900 °F (grey darker than «dark grey» [with «dark violet-blue» particles]) / irradiated with gamma rays at 424.7 Mrad[81,239,1189] |
| | | mineral : graphite<br>rock : dark grey, with metallic brilliance<br>powder : dark grey, with metallic brilliance |

| | | |
|---|---|---|
| grey a bit more pale than «dark grey» | 9542 | origin : Grenville, Québec<br><br>production process:<br>(followed from «grey a bit darker than "dark grey"»)<br>rock irradiated with gamma rays at 482.984 Mrad |
| grey a bit lighter than «dark grey» | 9543 | mineral : magnetite<br>rock : dark grey, with metallic brilliance<br>powder : dark grey<br>origin : Fosse du Labrador, Québec<br><br>production process:<br>powder irradiated with gamma[239] rays at 64.7 Mrad<br>(followed at «brownish black») |
| dark grey | 9544 | mineral : calcite[11]<br>powder : white<br>origin : Calcite du Nord Company, Saint-Eugène de Mistassini, Lac Saint-Jean, Québec<br><br>mineral : chrome<br>powder : light grey, with metallic brilliance<br><br>production process:<br>.50 g of calcite + .50 g of chrome + .50 g of SiC / 0↑1800 °F<br>(followed at «dark greenish grey») |
| dark grey | 9545 | mineral : cerite<br>rock : dark brownish grey<br>powder : light grey (light brown tone)<br>origin : Jamestown, Boulder county, Colorado, United States<br><br>production process:<br>4 g of cerite + 80 ml phosphoric acid / soaking: 2 wk. / drying on hot plate (still humid) / colour of the liquid[78] |
| | | mineral : chalcocite<br>rock : dark iron-grey (with localized turquoise oxidation)<br>powder : dark iron-grey<br>origin : Butte, Montana, United States<br><br>mineral : sulphur<br>rock : brilliant yellow<br>powder : brilliant yellow<br>origin : unknown |

1803

| | | |
|---|---|---|
| dark grey | 9546 | <u>production process:</u><br>2 g of chalcocite + 2 g of sulphur / 1300 °F / 1 h (dark chocolate-brown) / irradiated with electrons at 162,431 rad |
| dark grey | 9547 | mineral : chalcopyrite<br>rock : brass-yellow, with metallic brilliance<br>powder : dark grey (with golden particles)<br>origin : Noranda Mines, Noranda, Abitibi, Québec<br><br><u>production process:</u><br>rock irradiated with electrons at 164,800 rad[1191] |
| dark grey | 9548 | <u>production process:</u><br>(followed from «light green»)<br>2 g of chalcopyrite + 20 ml phosphoric acid / soaking: 3 d. / drying on hot plate (still humid) / colour of the solid[210] |
| dark grey | 9549 | mineral : copper concentrate (Cu-FeS)<br>powder : medium chocolate-brown (grey tone)<br>origin : Centre de recherche des Mines Noranda in Montréal, Québec<br><br><u>production process:</u><br>4 g of concentrate + 50 ml phosphoric acid / soaking: 4 years / drying on hot plate (still humid) / colour of the solid[1192] |
| dark grey | 9550 | mineral : copper<br>rock : reddish brown, with metallic luster<br>powder : reddish brown, with metallic luster<br>origin : unknown<br><br><u>production process:</u><br>(followed from «light emerald-green»)<br>rock entirely covered with 1000 ml acetic acid / natural drying / removal of the crystals formed at the surface of the rock (the colour of the crystals: pronounced emerald-green): 2 g + 20 ml phosphoric acid / soaking: 3 d. / drying on hot plate (still humid) / colour of the solid[55,1193] |
| | | mineral : galena<br>rock : dark grey, with metallic brilliance<br>powder : dark grey, with metallic brilliance<br>origin : Trail, British Columbia |

1804

| | | |
|---|---|---|
| dark grey | 9551 | <u>production process:</u><br>8 g of galena + 20 ml hydrofluoric acid / soaking: 24 h / drying in drying oven at 100 °F |
| dark grey | 9552 | mineral : graphite<br>rock : dark grey, with metallic brilliance<br>powder : dark grey, with metallic brilliance<br>origin : Grenville, Québec<br><br>mineral : sulphur<br>rock : brilliant yellow<br>powder : brilliant yellow<br>origin : unknown<br><br><u>production process:</u><br>2 g of graphite + 2 g of sulphur / 1300 °F / 1 h |
| dark grey | 9553 | mineral : sandstone<br>rock : medium pinkish brown (light violet tone)<br>powder : medium pinkish brown (light violet tone)<br>origin : at the rear of Percé, Gaspésie, Québec<br><br><u>production process:</u><br>4 g of sandstone + 80 ml phosphoric acid / soaking: 2 wk. / drying on hot plate (still humid) / colour of the solid[1194] |
| | | mineral : halite[41]<br>rock : colourless<br>powder : colourless<br>origin : Seleine Mine, Iles-de-la-Madeleine, Québec<br><br><u>production process:</u><br>(followed from «grey darker than "light grey"») rock irradiated with neutrons at $10^{12}$ neutrons / $cm^2$ / sec. during: |
| dark grey | 9554 | 1,500 seconds |
| still darker grey | 9555 | 2,000 seconds |
| still darker grey (with blue area) | 9556 | 3,000 seconds |
| still darker grey | 9557 | 4,500 seconds |
| still darker grey | 9558 | 6,000 seconds |

1805

| | | |
|---|---|---|
| still darker grey | 9559 | 8,000 seconds |
| darker grey | 9560 | 10,000 seconds |
| still darker grey | 9561 | 15,000 seconds (followed at «black») |
| | | mineral : magnetite<br>rock : dark grey, with metallic brilliance<br>powder : dark grey<br>origin : Fosse du Labrador, Québec<br><br>production process:<br>rock irradiated with gamma rays at: |
| dark grey | 9562 | 5 Mrad |
| | 9563 | 10 Mrad |
| | 9564 | 57.4 Mrad |
| which | 9565 | 63.984 Mrad |
| | 9566 | 102.4 Mrad |
| | 9567 | 122.984 Mrad |
| darkens | 9568 | 148.4 Mrad |
| and | 9569 | 201.6 Mrad |
| becomes | 9570 | 247.6 Mrad |
| ↓ | 9571 | 287.3 Mrad |
| more brown | 9572 | 360 Mrad (followed at «brownish black») |
| | | mineral : malachite<br>rock : ribboned variety of pronounced mint-green<br>powder : light and brilliant mint-green<br>origin : Katanga province, at 300 km from Lubumbachai, Zaïr, Africa<br><br>mineral : sulphur<br>rock : brilliant yellow<br>powder : brilliant yellow<br>origin : unknown<br><br>production process:<br>(followed from «black») |
| dark grey | 9573 | 2 g of malachite + 2 g of sulphur / 1500 °F / 1 h |
| | | mineral : molybdenite[48] (flakes of $MoS_2$ + pegmatite [quartz + bismuth])<br>rock : transparent and grey<br>powder : medium cold grey<br>origin : Lamotte, Abitibi, Québec |

| | | |
|---|---|---|
| dark grey | 9574 | production process:<br>6 g of molybdenite + 80 ml phosphoric acid / soaking: 2 wk. / drying on hot plate (still humid) / colour of the solid[6] |
| dark grey | 9575 | production process:<br>rock irradiated with gamma rays at:<br>65.704 Mrad |
| ↓<br>dark grey | 9576 | 244.53 Mrad<br>(followed at «dark greyish brown») |
| dark grey [with green spots] | 9577 | mineral : pyrrhotite[276]<br>rock : dark greyish brown, with golden yellow metallic brilliance<br>powder : dark grey<br>origin : Inco Co., Sudbury, Ontario<br><br>production process:<br>4 g of pyrrhotite + 20 ml phosphoric acid / soaking: 3 wk. / drying on hot plate (still humid) / colour of the solid[210] |
| dark grey | 9578 | production process:<br>0↑1000 °C |
| dark grey [with dark violet-blue particles] | 9579 | mineral : smaltite[25], variety of skutterudite<br>rock : dark iron-grey, with silver metallic brilliance<br>powder : dark grey<br>origin : Cobalt, Ontario<br><br>production process:<br>(followed from «chocolate-brown darker than "dark chocolate-brown"»)<br>2 g of smaltite + 2.50 g of sodium carbonate[1195]:<br>0↑1500 °F + 1 h at 1500 °F |
| \|<br>dark grey [with dark violet-blue particles] | 9580 | 0↑1600 °F + 1 h at 1600 °F |
| \|<br>still darker grey [with dark violet-blue particles] | 9581 | 0↑1700 °F + 1 h at 1700 °F |
| \|<br>still darker grey | 9582 | 0↑1800 °F + 1 h at 1800 °F |

1807

| | | |
|---|---|---|
| [with dark violet -blue particles] ↓ still darker grey [with dark violet -blue particles] | 9583 | 0↑1900 °F + 1 h at 1900 °F |
| dark grey [with dark royal-blue particles] | 9584 | <u>production process:</u><br>(followed from «dark blue [with a dark grey area]»)<br>1 g of smaltite + 2 g of sodium carbonate / 1800 °F / 1 h[1196,1197]<br>(followed at «intense royal-blue, dark and brilliant [with a crust, black in appearance]») |
| ↓ | | (followed from «intense royal-blue, dark and brilliant [with a crust, black in appearance]» and «dark greenish blue») |
| dark grey [with dark royal-blue particles] | 9585 | 1 g of smaltite + 3 g of sodium carbonate / 1800 °F / 1 h[1196,1197]<br>(followed at «dark violet-blue») |
| dark grey | 9586 | mineral : spodumene<br>rock : pale green<br>powder : light grey, almost white<br>origin : Québec Lithium Co., Baraute, Abitibi, Québec<br><br><u>production process:</u><br>2 g of spodumene + 2 g of sodium carbonate / 0↑1500 °F + 1 h at 1500 °F (mixture of particles: olive-green / brown) / irradiated with gamma rays at 63.88 Mrad<br>(followed at «mixture of particles: grey / chocolate-brown») |
| dark grey | 9587 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>2 g of powder finely grinded + 20 ml phosphoric acid / soaking: 3 d. / drying on hot plate (still humid) / colour of the solid[6] |

1808

| | | |
|---|---|---|
| dark grey | 9588 | mineral : nickel sulphide<br>rock : dark grey<br>powder : dark grey<br>origin : Sudbury, Ontario<br><br>production process:<br>35 g of nickel sulphide + 100 ml phosphoric acid / soaking: 3 wk. / drying on hot plate (still humid) / colour of the solid[593] |
| dark grey | 9589 | mineral : tourmaline<br>rock : very dark grey, almost black<br>powder : very dark grey, almost black<br>origin : Villeneuve Mine, Papineau county, Québec<br><br>production process:<br>2 g of tourmaline + 20 ml hydrofluoric acid / soaking: 24 h / drying in drying oven at 100 °F[1198] |
| dark grey | 9590 | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><br>production process:<br>1 g of vesuvianite + 2 g of sodium carbonate + 1 g of sulphur / 1700 °F / 1 h |
| dark grey | 9591 | mineral : zircon<br>rock : grey and brown<br>origin : Mont Saint-Hilaire, Québec<br><br>mineral : sulphur<br>rock : brilliant yellow<br>powder : brilliant yellow<br>origin : unknown<br><br>production process:<br>1 g of zircon + 1 g of sulphur / 1600 °F / 1 h[1199] |
| | | mineral : limestone<br>rock : dark grey<br>origin : region of Montréal, Québec |

1809

| | | |
|---|---|---|
| grey a bit more accentuated than «dark grey» | 9592 | production process:<br>irradiated with electrons at 164,800 rad |
| grey a bit darker than «dark grey» | 9593 | mineral : anorthosite<br>rock : dark grey<br>powder : medium grey<br>origin : Jonquière, Lac Saint-Jean, Québec<br><br>production process:<br>rock irradiated with electrons at 164,800 rad |
| grey a bit darker than «dark grey»<br>↓<br>grey still a bit darker | 9594<br><br>9595 | production process:<br>rock irradiated with gamma rays at:<br>5 Mrad<br><br>10 Mrad<br>(followed at «brownish grey darker than "dark brownish grey"») |
| grey a bit darker than «dark grey» | 9596 | mineral : graphite<br>rock : dark grey, with metallic brilliance<br>powder : dark grey, with metallic brilliance<br>origin : Grenville, Québec<br><br>production process:<br>rock irradiated with gamma rays at 122.984 Mrad[509]<br>(followed at «grey a bit more pale than "dark grey"») |
| grey a bit darker than «dark grey» | 9597 | production process:<br>rock irradiated with electrons at 164,800 rad |
| grey a bit darker than «dark grey»<br>\| | 9598 | mineral : sphalerite[27]<br>rock : dark grey, with golden yellow metallic brilliance<br>powder : dark brownish grey<br>origin : Matagami Mine, Matagami, Québec<br><br>production process:<br>rock irradiated with gamma[228] rays at:<br>5 Mrad |

| | | |
|---|---|---|
| grey a bit darker<br>↓<br>darker grey<br>↓<br>still darker grey<br>↓<br>still darker grey<br>↓<br>still darker grey | 9599<br><br>9600<br><br>9601<br><br>9602<br><br>9603 | 10 Mrad<br><br>57.4 Mrad<br><br>63.984 Mrad<br><br>102.4 Mrad<br><br>148.4 Mrad<br>(followed at «brownish grey [light brown tone] a bit darker than "dark brownish grey"») |
| grey darker than than «dark grey» | 9604 | mineral : limestone<br>rock : dark grey<br>origin : region of Montréal, Québec<br><br><u>production process:</u><br>rock irradiated with gamma rays at 122.984 Mrad[505]<br>(followed at «dark chocolate-brown») |
| grey darker than «dark grey» | 9605 | mineral : malachite<br>rock : ribboned variety of pronounced mint-green<br>powder : light and brilliant mint-green<br>origin : Katanga province, at 300 km from Lubumbachai, Zaïr, Africa<br><br>mineral : sulphur<br>rock : brilliant yellow<br>powder : brilliant yellow<br>origin : unknown<br><br><u>production process:</u><br>2 g of malachite + 2 g of sulphur / 1500 °F / 1 h (dark grey) / irradiated with gamma[239] rays at 64.7 Mrad<br>(followed at «black [blue reflection]») |
| grey darker and colder than «dark grey» | 9606 | mineral : galena<br>rock : dark grey, with metallic brilliance<br>powder : dark grey, with metallic brilliance<br>origin : Gisement Sullivan, COMINCO Co., Co-Trail, British Columbia<br><br><u>production process:</u><br>powder irradiated with gamma rays at 64.7 Mrad<br>(followed at «brownish grey a bit darker than "dark brownish grey"») |

1811

| | | |
|---|---|---|
| grey much darker than «dark grey» | 9607 | production process:<br>rock irradiated with gamma rays at 124.704 Mrad[433,1204]<br>(followed at «blackish grey») |
| | | mineral : smaltite[25], variety of skutterudite<br>rock : dark iron-grey, with silver metallic brilliance<br>powder : dark grey<br>origin : Cobalt, Ontario<br><br>production process:<br>(followed from «iron-grey darker than "iron-grey"»)<br>rock irradiated with gamma[228] rays at: |
| grey much darker than «dark grey»<br>↓ | 9608 | 124.704 Mrad |
| grey identical to the previous one | 9609 | 148.4 Mrad<br>(followed at «brownish grey») |
| | 9610 | mineral : silver<br>rock : silver peak and stria, with metallic brilliance and quartz<br>origin : Cobalt, Ontario<br><br>production process: |
| very dark grey | 9611 | rock irradiated with gamma rays at 360 Mrad |
| | | mineral : sodalite, hackmanite variety, fluorescent and phosphorescent<br>rock : crystals: very dark grey, almost black<br>origin : Poudrette quarry, Mont Saint-Hilaire, Québec<br><br>production process:<br>cristals irradiated with gamma[67] rays at: |
| grey a bit darker than «very dark grey, almost black»<br>¦ | 9612 | 5 Mrad |
| grey a bit darker<br>¦ | 9613 | 10 Mrad |
| grey still a bit darker<br>¦ | 9614 | 57.4 Mrad |
| much darker grey<br>¦ | 9615 | 64.7 Mrad |

1812

| | | |
|---|---|---|
| still darker grey<br>↓ | 9616 | 102.4 Mrad |
| grey equivalent to the previous one<br>↓ | 9617 | 148.4 Mrad |
| still darker grey<br>↓ | 9618 | 201.6 Mrad |
| still darker grey | 9619 | 247.6 Mrad<br>(followed at «blackish grey») |
| mixture of particles | | |
| very light grey / very light beige / white | 9620 | mineral : cement[82]<br>powder : medium cold grey<br>origin : Union des Carrières, Limoilou, Québec<br><br>production process:<br>(followed from «beige darker than "light beige"»)<br>2 g of cement + 2 g of sodium carbonate / 0↑1500 °F + 1 h at 1500 °F (light beige [light orange tone]) / irradiated with gamma rays at 424.7 Mrad |
| light grey / light beige / mostly medium greyish brown | 9621 | mineral : andulusite<br>rock : light brownish grey<br>powder : light grey<br>origin : Bimbowrie, South Australia<br><br>production process:<br>(followed from «yellowish beige»)<br>0↑1900 °F (light beige): 1 g + 50 ml nitric acid / soaking: 2 wk. / separation of the liquid and the solid / drying on hot plate (colour of the solid: very light yellowish beige) / irradiated with gamma rays at 430.4 Mrad |
| light grey or light lilac or light pink<br>↓ | 9622 | mineral : barite<br>rock : pinkish white<br><br>powder : white<br>origin : Niobec Mine, Saint-Honoré, Saguenay, Québec<br><br>production process:<br>4 g of barite + 50 ml nitric acid / soaking: 2 wk. / drying on hot plate (white [light yellow reflection]) / irradiated with gamma rays at:<br>64.7 Mrad[1206] |

| | | |
|---|---|---|
| light grey / grey darker than «light grey» / light beige / medium beige | 9623 | 424.7 Mrad[697] |
| grey / white | 9624 | mineral : andulusite<br>rock : light brownish grey<br>powder : light grey<br>origin : Bimbowrie, South Australia<br><br>production process:<br>0↑1900 °F (light beige): 1 g + 50 ml sulphuric acid / soaking: 2 wk. / separation of the liquid and the solid / drying on hot plate (colour of the liquid: opaque white) / irradiated with electrons at 163,431 rad |
| medium grey / medium brown | 9625 | mineral : tremolite<br>rock : medium brown (evergreen tone)<br>powder : greyish beige<br>origin : Tetreault Mine, Montauban, Portneuf county, Québec<br><br>production process:<br>1 g of tremolite + 1.50 g of sodium carbonate / 1600 °F / 1 h (dark grass-green) / irradiated with gamma rays at 190.22 Mrad (followed at «mixture of particles: medium milky chocolate-brown / white») |
| light grey / medium grey / dark grey | 9626 | mineral : analcime<br>rock : white (grey reflection), crystalline and translucid<br>powder : light grey<br>origin : De-Mix quarry, North side of Mont Saint-Hilaire, Rouville county, Québec<br><br>production process:<br>0↑2000 °F (very light grey, crystalline and translucid) / powder irradiated with electrons at 302,831 rad[36] |
| grey ranging from «light grey» to | 9627 | mineral : sodalite<br>rock : cold light blue<br>powder : light grey (light blue tone)<br>origin : Bancroft, Ontario<br><br>production process:<br>2 g of sodalite + 2 g of sodium carbonate / 0↑1500 °F + 45 min. at 1500 °F (light bluish green)/ |

| | | |
|---|---|---|
| «dark grey» | | irradiated with gamma rays at 424.7 Mrad |
| silver-grey | | |
| grey (light silver tone) | 9628 | mineral : mussel shell or calcium carbonate<br>shell : dark indigo-blue (violet tone)<br>powder : white<br>origin : bank of Saint-Lawrence river, Baie-des-Chaleurs, Gaspésie, Québec<br><br><u>production process:</u><br>shell irradiated with gamma rays at 65.704 Mrad (followed at «dark pinkish beige») |
| | 9629 | mineral : bismuth<br>powder : silver-grey, with metallic brilliance<br>origin : Cominco Ltd., Canada |
| silver-grey darker than «silver-grey» | 9630 | <u>production process:</u><br>irradiated with gamma rays at 482.984 Mrad[81,228] |
| metallic grey | | |
| light metallic grey | 9631 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>(followed from «yellow more accentuated than "light yellow"»)<br>powder finely grinded and heated 0↑1400 °F (followed at «brownish grey, with a white metallic brilliance» and «very light brownish grey, with metallic brilliance») |
| metallic grey a bit darker than «light metallic grey» | 9632 | mineral : chrome<br>powder : light grey, with metallic brilliance<br><br><u>production process:</u><br>powder irradiated with gamma[239] rays at 64.7 Mrad (followed at «metallic grey [between "light" and "medium" metallic grey]») |
| | | mineral : cement[269]<br>powder : medium brownish grey<br>origin : CALCO, Charlesbourg, Québec |

| | | |
|---|---|---|
| | | production process:<br>(followed at «dark brown»)<br>2 g of cement + 2 g of sodium carbonate: |
| metallic grey | 9633 | 0↑1700 °F + 1 h at 1700 °F |
| ↓ | | |
| metallic grey | 9634 | 0↑1800 °F + 1 h at 1800 °F |
| ↓ | | |
| metallic grey | 9635 | 0↑1900 °F + 1 h at 1900 °F |
| | | mineral : galena<br>rock : dark grey, with metallic brilliance<br>powder : dark grey, with metallic brilliance<br>origin : Trail, British Columbia<br><br>mineral : cement[1138]<br>powder : white<br><br>production process:<br>27.40 g of cement + 13 cc of water / manual grinding / moulding / 1 g of galena immediately deposited at the surface of the humid piece of cement / hardening / addition of 5 g of galena at the surface of the dried piece of cement: |
| metallic grey | 9636 | 0↑1400 °F |
| ↓ | | |
| metallic grey | 9637 | 0↑1500 °F<br>(followed at «orange-brown [green tone] / yellow orange») |
| | | mineral : graphite<br>rock : dark grey, with metallic brilliance<br>powder : dark grey, with metallic brilliance<br>origin : Grenville, Québec<br><br>production process: |
| metallic grey | 9638 | 1 g of graphite + 2 g of potassium carbonate / 0↑1500 °F[1210]<br>(followed at «intense emerald-green») |
| | | mineral : iron pyrite<br>powder : greyish brown, with golden yellow metallic brilliance<br>origin : Rigaud seigniory, Beauce county, Québec<br>production process:<br>(followed from «dark chocolate-brown»)<br>2 g of pyrite + 2 g of sodium carbonate: |
| metallic grey | 9639 | 0↑1600 °F + 1 h at 1600 °F |
| ↓ | | |
| metallic grey | 9640 | 0↑1700 °F + 1 h at 1700 °F |
| ↓ | | |
| metallic grey | 9641 | 0↑1800 °F + 1 h at 1800 °F |
| ↓ | | |

1816

| | | |
|---|---|---|
| metallic grey | 9642 | 0↑1900 °F + 1 h at 1900 °F |
| metallic grey | 9643 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>(followed from «yellow»)<br>powder finely grinded and heated 0↑1400 °F |
| metallic grey [between «light metallic grey» and «medium metallic grey»] | 9644 | mineral : chrome<br>powder : light grey, with metallic brilliance<br><br><u>production process:</u><br>(followed from «metallic grey a bit darker than "light metallic grey"»)<br>powder irradiated with gamma[239] rays at 424.7 Mrad |
| metallic grey a bit darker than «medium metallic grey» | 9645 | mineral : zinc<br>powder : medium grey, with metallic brilliance<br><br><u>production process:</u><br>powder irradiated with gamma[45,571] rays at:<br>5 Mrad |
| ↓ | 9646 | 10 Mrad |
| ↓ | 9647 | 57.4 Mrad |
| ↓ which | 9648 | 64.7 Mrad |
| ↓ darkens | 9649 | 102.4 Mrad |
| ↓ towards | 9650 | 148.4 Mrad |
| ↓ | 9651 | 201.6 Mrad |
| ↓ | 9652 | 247.6 Mrad |
| ↓ | 9653 | 287.3 Mrad |
| ↓ | 9654 | 360 Mrad |
| metallic grey [between «medium metallic grey» and «dark metallic grey»] | 9655 | 424.7 Mrad |
| | | mineral : molybdenite[103]<br>rock : medium grey, with metallic brilliance<br>powder : medium grey, with metallic brilliance<br>origin : Anglo American Molybdenite Mine, near |

| | | |
|---|---|---|
| dark metallic grey | 9656 | Lamotte, Preissiac district, Abitibi, Québec<br><br>production process:<br>rock hermetically wrapped in bread dough / 0↑1300 °F |
| dark metallic grey | 9656.1 | mineral : goethite[106]<br>powder : rusty orange<br>origin : Red Mill, in the suburbs of Cap-de-la-Madeleine, Québec<br><br>production process:<br>1 g of goethite + 5 g of pyrex / manual grinding / heating: 5 °C per min. 0↑1245 °C + maintenance during 1 h / cooling: 5 °C per min. until ambient temperature is reached / the entity is done in ambient air |
| | | mineral : galena<br>rock : dark grey, with metallic brilliance<br>powder : dark grey, with metallic brilliance<br>origin : Trail, British Columbia<br><br>production process:<br>powder irradiated with gamma[239] rays at: |
| metallic grey | 9657 | 5 Mrad[1203] |
| darker than «dark metallic grey» | 9658 | 5.7 Mrad |
| ↓ still darker metallic grey | 9659 | 57.4 Mrad |
| ↓ darker metallic grey | 9660 | 64.7 Mrad |
| ↓ still darker metallic grey | 9661 | 102.4 Mrad |
| ↓ darker metallic grey | 9662 | 148.4 Mrad[1202] |
| ↓ still darker metallic grey | 9663 | 201.6 Mrad |
| ↓ darker metallic grey | 9664 | 247.6 Mrad |

| | | |
|---|---|---|
| ↓<br>still darker metallic grey | 9665 | 287.3 Mrad<br>(followed at «very dark brownish grey, almost black») |
| | | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>rock irradiated with gamma rays at: |
| metallic grey a bit darker than «dark metallic grey» | 9666 | 65.704 Mrad[1211] |
| ↓<br>darker metallic grey | 9667 | 102.4 Mrad |
| ↓<br>still darker metallic grey | 9668 | 130.44 Mrad[1183] |
| ↓<br>darker metallic grey | 9669 | 148.4 Mrad |
| ↓<br>still darker metallic grey | 9670 | 201.6 Mrad |
| ↓<br>darker metallic grey | 9671 | 244.53 Mrad<br>247.6 Mrad |
| ↓<br>still darker metallic grey | 9672 | 287.3 Mrad |
| ↓<br>very dark metallic grey | 9673 | 360 Mrad[1212]<br>(followed at «blackish grey») |
| | | <u>production process:</u><br>powder finely grinded and irradiated with gamma rays at: |
| metallic grey a bit darker than «dark metallic grey» | 9674 | 65.704 Mrad |
| ↓<br>metallic grey | 9675 | 124.704 Mrad |

1819

| | | |
|---|---|---|
| darker than «dark metallic grey» | | (followed at «brownish grey [between "medium" and "dark brownish grey"]») |
| | | mineral : stibnite<br>rock : dark grey, with silver and blue metallic brilliance<br>powder : dark grey<br>origin : Consolidated Durham Mine, Saint-Georges, New Brunswick<br><br>production process:<br>rock irradiated with gamma rays at: |
| metallic grey darker than «dark metallic grey» | 9676 | 63.984 Mrad |
| ↓ | | |
| much darker metallic grey | 9677 | 242.804 Mrad[1213]<br>(followed at «blackish brown-grey») |
| | | production process: |
| metallic grey darker than «dark metallic grey» | 9678 | powder irradiated with gamma[239] rays at 64.7 Mrad<br><br>(followed at «metallic grey [light brown tone]») |
| | | mineral : stibnite<br>rock : dark grey, with metallic brilliance<br>powder : dark grey, with metallic brilliance<br>origin : Hunan, China<br><br>production process:<br>powder irradiated with gamma[239] rays at: |
| metallic grey darker than «dark metallic grey» | 9679 | 5 Mrad |
| \| | | |
| a bit darker metallic grey | 9680 | 10 Mrad |
| \| | | |
| still darker metallic grey | 9681 | 57.4 Mrad |
| \| | | |
| darker and colder metallic grey | 9682 | 64.7 Mrad[1214] |
| \| | | |
| still darker | 9683 | 102.4 Mrad |

| | | |
|---|---|---|
| metallic grey<br>↓<br>darker metallic grey | 9684 | 148.4 Mrad |
| ↓<br>darker metallic grey | 9685 | 201.6 Mrad |
| ↓<br>still darker metallic grey | 9686 | 247.6 Mrad |
| ↓<br>still darker metallic grey | 9687 | 287.3 Mrad |
| ↓<br>blackish metallic grey | 9688 | 360 Mrad<br>(followed at «greyish black») |
| | | mineral : ilmenite<br>rock : blackish grey, with metallic luster<br>powder : blackish grey, with metallic luster<br>origin : Québec Fer et Titane Co., Havre Saint-Pierre, Québec<br><br><u>production process:</u><br>rock irradiated with gamma[228] rays at: |
| metallic grey still more black than «blackish metallic grey» | 9689 | 10 Mrad[1215] |
| ↓<br>metallic grey still a bit more blackish | 9690 | 57.4 Mrad |
| ↓<br>still darker metallic grey | 9691 | 63.984 Mrad<br>(followed at «dark grey [accentuated brown tone]») |
| metallic grey (blue tone) | | |
| | | mineral : tellurium<br>powder : dark metallic grey<br>origin : Minéraux Noranda Inc., lot 64, Montréal, Québec<br><br><u>production process:</u><br>1 g of tellurium + 5 g of pyrex / manual grinding / heating: 5 °C per min. 0↑1245 °C + maintenance during 1 h / cooling: 5 °C per min. until ambient temperature is reached / the entity is done in am- |

| | | |
|---|---|---|
| | | bient air (light Naples yellow) / irradiated with gamma rays at: |
| light metallic grey (blue reflection) | 9691.1 | 7.41 Mrad |
| ↓ | | |
| metallic grey (blue reflection) a bit darker | 9691.2 | 9.88 Mrad |
| metallic grey (brown tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «blackish green»)<br>1 g of goethite + 2 g of sodium carbonate + 1 g of sulphur: |
| metallic grey (brown tone) | 9692 | 0↑1800 °F |
| ↓ | | |
| metallic grey (brown tone) | 9693 | 0↑1900 °F |
| ↓ | | |
| metallic grey (brown tone) | 9694 | 0↑2000 °F<br>(followed at «blackish green») |
| | | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process: |
| dark metallic grey (brown tone) | 9695 | 10 g of galena powder + 10 g of sulphur / grinded and distributed in 8 porcelain covers usually used for porcelain crucibles / 0↑1200 °F[1216]<br>(followed at «grey») |
| | | mineral : stibnite<br>rock : dark grey, with silver and blue |

| | | |
|---|---|---|
| metallic grey (light brown tone) darker and more black than «dark metallic grey (brown tone)» | 9696 | metallic brilliance<br>powder : dark grey<br>origin : Consolidated Durham Mine, Saint-Georges, New Brunswick<br><br>production process:<br>(followed from «metallic grey darker than "dark metallic grey"»)<br>powder irradiated with gamma[239] rays at 424.7 Mrad |
| iron-grey | | |
| very, very light iron-grey [with a few «cobalt-blue» particles] | 9697 | mineral : beryl<br>rock : intense grass-green, slightly translucid<br>powder : greenish grey<br>origin : unknown<br><br>production process:<br>3 g of beryl + 40 ml sulphuric acid / soaking: 18 d. / separation of the liquid and the solid / drying on hot plate / colour of the solid[1115,1205,1216a,1231] |
| light iron-grey | 9698 | mineral : halite[41]<br>rock : colourless<br>powder : colourless<br>origin : Seleine Mine, Iles-de-la-Madeleine, Québec<br><br>production process:<br>powder filtered at 14 meshes irradiated with gamma rays at 5.7 Mrad<br>(followed at «brownish grey») |
| light iron-grey | 9699 | production process:<br>powder filtered at 42 meshes irradiated with gamma rays at 5.7 Mrad<br>(followed at «brownish grey») |
| | | mineral : smaltite[25], variety of skutterudite<br>rock : dark iron-grey, with silver metallic brilliance<br>powder : dark grey<br>origin : Cobalt, Ontario |

| | | |
|---|---|---|
| | | production process: |
| light iron-grey [with «dark royal-blue» particles ] | 9700 | 1 g of smaltite + 2.50 g of sodium carbonate / 1600 °F / 1 h[1217] |
| ↓ | | |
| darker iron-grey [with [«dark royal-blue» particles] | 9701 | 1 g of smaltite + 2.50 g of sodium carbonate / 1700 °F / 1 h[1218]<br>(followed at «intense royal-blue, dark and brillant [with a black crust in appearance]») |
| | | mineral : tourmaline<br>rock : very dark grey, almost black<br>powder : very dark grey, almost black<br>origin : Villeneuve Mine, Papineau county, Québec |
| | | production process: |
| light iron-grey | 9702 | 2 g of tourmaline + 25 ml nitric acid / soaking: 3 d. / drying on hot plate (medium cold iron-grey) / irradiated with electrons at 302,831 rad[36] |
| | | mineral : amazon stone<br>rock : light greenish turquoise, translucid<br>powder : white (turquoise reflection)<br>origin : unknown |
| | | production process: |
| light iron-grey | 9703 | rock hermetically wrapped in bread dough / 1600 °F / 1 h |
| | | production process: |
| iron-grey darker than «light iron-grey» | 9704 | rock hermetically wrapped in bread dough / 1600 °F / 1 h (light iron-grey) / irradiated with gamma rays at 64.7 Mrad |
| | | mineral : galena<br>rock : dark grey, with metallic brilliance<br>powder : dark grey, with metallic brilliance<br>origin : Trail, British Columbia |
| | | mineral : cement[1136]<br>powder : white |
| | | production process: |
| | | 1 g of galena powder is integrated to the mass of 27.40 g of cement + 13 cc of water / manual grinding / moulding / hardening / addition of 5 g of galena to the surface of the piece of dried cement: |
| iron-grey | 9705 | 0↑1400 °F |
| ↓ | | |
| iron-grey | 9706 | 0↑1500 °F[280,1219,1220]<br>(followed at «orange-brown [green tone] / yellow / orange») |

1824

| | | |
|---|---|---|
| | | mineral : goethite[106]<br>powder : rusty orange<br>origin : Red Mill, in the suburbs of Cap-de-la-Madeleine, Québec<br><br>production process:<br>(followed from «mossy olive-green»)<br>4 g of goethite + 4 g of sodium carbonate / 0↑1900 °F<br>(followed at «brownish red» [2 g / 3 g]) |
| iron-grey | 9707 | |
| iron-grey | 9708 | production process:<br>(followed from «mossy olive-green»)<br>4 g of goethite + 3 g of sodium carbonate / 0↑1900 °F<br>(followed at «brownish red» [4 g / 4 g]) |
| iron-grey | 9709 | production process:<br>(followed from «mossy olive-green»)<br>4 g of goethite + 2 g of sodium carbonate / 0↑1900 °F<br>(followed at «brownish red» [4 g / 3 g]) |
| iron-grey | 9710 | production process:<br>(followed from «mossy olive-green»)<br>4 g of goethite + 1 g of sodium carbonate / 0↑1900 °F<br>(followed at «brownish red» [4 g / 2 g]) |
| iron-grey | 9711 | production process:<br>(followed from «mossy olive-green»)<br>3 g of goethite + 4 g of sodium carbonate / 0↑1900 °F<br>(followed at «brownish red» [3 g / 1 g]) |
| iron-grey | 9712 | production process:<br>(followed from «mossy olive-green»)<br>2 g of goethite + 4 g of sodium carbonate / 0↑1900 °F<br>(followed at «brownish red» [3 g / 4 g]) |
| iron-grey | 9713 | production process:<br>(followed from «mossy olive-green»)<br>1 g of goethite + 4 g of sodium carbonate / 0↑1900 °F<br>(followed at «reddish orange» [4 g / 1 g]) |
| iron-grey | 9714 | production process:<br>(followed from «mossy olive-green»)<br>2 g of goethite + 3 g of sodium carbonate |

1825

| | | |
|---|---|---|
| | | / 0↑1900 °F<br>(followed at «brownish red») |
| iron-grey | 9715 | production process:<br>(followed from «mossy olive-green»)<br>1 g of goethite + 3 g of sodium carbonate<br>/ 0↑1900 °F<br>(followed at «brownish red» [1 g / 4 g]) |
| iron-grey | 9716 | production process:<br>(followed from «mossy olive-green»)<br>3 g of goethite + 1 g of sodium carbonate<br>/ 0↑1900 °F<br>(followed at «brownish red» [3 g / 2 g]) |
| iron-grey | 9717 | production process:<br>(followed from «mossy olive-green»)<br>3 g of goethite + 2 g of sodium carbonate<br>/ 0↑1900 °F |
| iron-grey | 9718 | production process:<br>(followed from «mossy olive-green»)<br>1 g of goethite + 1 g of sodium carbonate<br>/ 0↑1900 °F<br>(followed at «brownish red» [1 g / 3 g]) |
| iron-grey | 9719 | mineral : haematite<br>rock : medium chocolate-brown<br>powder : medium chocolate-brown<br>origin : Nouveau Québec, Québec<br><br>production process:<br>0↑1800 °F (dark violet-brown): 4 g + 100 ml sul-<br>phuric acid / soaking: 2 wk. / drying on hot plate |
| | | mineral : copper<br>rock : reddish brown, with metallic luster<br>powder : reddish brown, with metallic luster<br>origin : unknown<br><br>production process:<br>(followed from «grey [light green tone]»)<br>100 g of copper + 100 ml nitric acid / soaking: 5<br>months / natural drying (light bluish turquoise): |
| iron-grey | 9720 | 0↑600 °F |
| ↓ | | |
| iron-grey | 9721 | 0↑700 °F |
| ↓ | | |
| very dark iron-grey, almost black | 9722 | 0↑800 °F<br>(followed at «black») |

1826

| | | |
|---|---|---|
| iron-grey<br>↓<br>which darkens towards<br>↓<br>iron-grey [almost black] | 9723<br><br>9724<br><br>9725 | <u>production process:</u><br>(followed from «bluish turquoise [grey tone]»)<br>100 g of copper + 100 ml nitric acid / soaking: 5 months / natural drying (light bluish turquoise): 0↑500 °F (grey [light green tone]): .50 g + 5 ml ammonia / natural drying<br><br>0↑600 °F (iron-grey): .50 g + 5 ml ammonia / natural drying<br><br>0↑700 °F (iron-grey): .50 g + 5 ml ammonia / natural drying<br>(followed at «black») |
| iron-grey<br>↓<br>darker iron-grey<br>↓<br>still darker iron-grey<br>↓<br>still darker iron-grey<br>↓<br>darker iron-grey | 9726<br><br>9727<br><br>9728<br><br>9729<br><br>9730 | mineral : smaltite[25], variety of skutterudite<br>rock : dark iron-grey, with silver metallic brilliance<br>powder : dark grey<br>origin : Cobalt, Ontario<br><br><u>production process:</u><br>rock irradiated with gamma rays at:<br>5 Mrad<br><br>10 Mrad<br><br>57.4 Mrad<br><br>65.704 Mrad<br><br>102.4 Mrad<br>(followed at «grey much darker than "dark grey"») |
| iron-grey lighter than «medium iron-grey» | 9731 | <u>production process:</u><br>1 g of smaltite + 1 g of sodium carbonate / 1800 °F / 1 h (medium iron-grey) / irradiated with electrons at 162,431 rad |
| medium iron-grey | 9731.1 | mineral : asbestos[4]<br>rock : dark grey (green reflection)<br>powder : light grey (green reflection)<br>origin : Asbestos Corporation Ltd., Thetford Mines, Québec<br><br><u>production process:</u><br>0↑1900 °F (chamois [light orange tone]): 50 g + 200 ml hydrochloric acid <u>or</u> asbestos entirely covered with hydrochloric acid / soaking: 1 wk. / |

| | | |
|---|---|---|
| | | drying on hot plate (vivid sunny yellow [light green tone]): 1 g + 5 g of pyrex / manual grinding / heating: 5 °C per min. 0↑1245 °C + maintenance during 1 h / cooling: 5 °C per min. until ambient temperature is reached / the entity is done in ambient air |
| medium iron-grey | 9731.2 | mineral : anorthosite<br>rock : dark grey<br>powder : medium grey<br>origin : Jonquière, Lac Saint-Jean<br><br>production process:<br>1 g of anorthosite + 5 g of pyrex / manual grinding / heating: 5 °C per min. 0↑1245 °C + maintenance during 1 h / cooling: 5 °C per min. until ambient temperature is reached / the entity is done in ambient air |
| medium iron-grey | 9732 | mineral : apophyllite<br>rock : milky white, translucid<br>powder : white<br>origin : Gaspé Copper Mine, Gaspé, Québec<br><br>production process:<br>0↑1800 °F (light grey): .20 g + 50 ml phosphoric acid / soaking: 2 wk. / drying on hot plate (still humid) / colour of the liquid[64] |
| medium iron-grey | 9733 | mineral : calcite (with clayey inclusions)<br>rock : very light creamy yellow, translucid<br>powder : white<br>origin : De-Mix quarry, near Saint-Philippe de Laprairie, Québec<br><br>mineral : sulphur<br>rock : brilliant yellow<br>powder : brilliant yellow<br>origin : unknown<br><br>production process:<br>1 g of calcite + 2 g of sodium carbonate + 1 g of sulphur / 1600 °F / 1 h |
| | | mineral : chromite<br>rock : blackish grey<br>powder : medium brownish grey<br>origin : Black Lake, near Thetford Mines, Québec<br><br>mineral : silica[91] |

| | | |
|---|---|---|
| cold medium iron-grey | 9734 | powder : very light grey, crystalline<br>origin : mine exploited by Développement Gex Inc. of Montréal for exploitation by SKW Bécancour. Lac La Galette, Charlevoix county, 30 miles at the North of Saint-Urbain, Québec<br><br>production process:<br>1 g of chromite + .50 g of silica / 0↑1800 °F |
| medium iron-grey | 9735 | mineral : fluorine<br>rock : very light and luminous evergreen, translucid<br>origin : Poudrette quarry, Mont Saint-Hilaire, Québec<br><br>production process:<br>rock hermetically wrapped in bread dough / 1500 °F / 1 h |
| medium iron-grey | 9736 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><br>production process:<br>1 g of fluorine + 1 cc of synthetic white transparent enamel paint used for the car / manual grinding / application on a piece of steel sheet used for the car's body measuring 1" x 1" (light grey) irradiated with gamma[351] rays at 5 Mrad (followed at «iron-grey [light lilac tone]») |
| medium iron-grey | 9737 | mineral : fluorine<br>rock : colourless<br>powder : colourless<br>origin : Ohio, United States<br><br>mineral : sulphur<br>rock : brilliant yellow<br>powder : brilliant yellow<br>origin : unknown<br><br>production process:<br>1 g of fluorine + 1 g of sulphur / 1600 °F / 1 h[1221] |
| | | mineral : graphite<br>rock : dark grey, with metallic brilliance<br>powder : dark grey, with metallic brilliance |

1829

| | | |
|---|---|---|
| | | origin : Grenville, Québec<br><br>production process:<br>4 g of graphite + 20 ml phosphoric acid / soaking: 3 d. / drying on hot plate (still humid) |
| medium iron-grey | 9738 | |
| | | mineral : halite[41]<br>rock : colourless<br>powder : colourless<br>origin : Seleine Mine, Iles-de-la-Madeleine, Québec<br><br>production process:<br>rock irradiated with gamma rays at: |
| medium iron-grey | 9739 | 5 Mrad |
| ↓ | | |
| medium iron-grey | 9740 | 5.7 Mrad[1222]<br>(followed at «brownish grey darker than "medium brownish grey"») |
| | | mineral : labrador<br>rock : blackish grey<br>powder : medium grey<br>origin : Lac Saint-Jean, Québec<br><br>production process: |
| medium iron-grey | 9741 | 2 g of labrador + 20 ml phosphoric acid / soaking: 3 d. / drying on hot plate (still humid) |
| | | mineral : iron pyrite<br>powder : greyish brown, with golden yellow metallic brilliance<br>origin : Rigaud seigniory, Beauce county, Québec<br><br>production process: |
| medium iron-grey | 9742 | 4 g of pyrite + 25 ml sulphuric acid / soaking: 3 d. / drying on hot plate |
| | | production process: |
| medium iron-grey | 9743 | 4 g of pyrite + 20 ml hydrofluoric acid / soaking: 24 h / drying in drying oven at 100 °F |
| | | mineral : serandite<br>rock : orange-pink or salmon (with more orange areas)<br>powder : pinkish white<br>origin : De-Mix quarry, North side of Mont Saint-Hilaire, Rouville county, Québec |

| | | |
|---|---|---|
| medium iron-grey | 9744 | production process:<br>(followed from «dark iron-grey»)<br>2 g of serandite + 2 g of sodium carbonate / 0†1500 °F + 1 h at 1500 °F (blackish brown) / ir-radiated with gamma[239] rays at 424.7 Mrad |
| medium iron-grey | 9745 | mineral : smaltite[25], variety of skutterudite<br>rock : dark iron-grey, with silver metallic brilliance<br>powder : dark grey<br>origin : Cobalt, Ontario<br><br>production process:<br>(followed from «black» and «dark brownish grey [with "dark royal-blue particles"]»)<br>1 g of smaltite + 1 g of sodium carbonate / 1800 °F / 1 h[1218]<br>(followed at «dark blue [with a "dark grey" area]») |
| medium iron-grey | 9746 | mineral : stilbite<br>rock : white (honey-yellow reflection)<br>powder : white (honey-yellow reflection)<br>origin : Lac d'amiante Mine, Black Lake, Québec<br><br>mineral : sulphur<br>rock : brilliant yellow<br>powder : brilliant yellow<br>origin : unknown<br><br>production process:<br>1 g of stilbite + 2 g of sodium carbonate + 1 g of sulphur / 1600 °F / 1 h |
| cold medium iron-grey | 9747 | mineral : tourmaline<br>rock : very dark grey, almost black<br>powder : very dark grey, almost black<br>origin : Villeneuve Mine, Papineau county, Québec<br><br>production process:<br>2 g of tourmaline + 25 ml nitric acid / soaking: 3 d. / drying on hot plate |
| | | mineral : iron sulphide - nickel[353]<br>rock : medium greyish green<br>powder : light grey (light green tone)<br>origin : small copper and nickel deposit, in the South-Western area of a mass of serpentinite at 3 km at the West of Saint-Fabien-de-Panet, Québec |

1831

| | | |
|---|---|---|
| medium iron-grey | 9748 | production process:<br>35 g of iron sulphide - nickel + 100 ml sulphuric acid / soaking: 1 wk. / drying on hot plate |
| medium iron-grey | 9749 | production process:<br>(followed from «light apple-green»)<br>15 g of iron sulphide - nickel + 100 ml nitric acid / soaking: 1 wk. / drying on hot plate |
| medium iron-grey | 9750 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>3 g of wilsonite + 80 ml phosphoric acid / soaking: 2 wk. / drying on hot plate (still humid) / colour of the solid[123] |
| iron-grey [between «medium iron-grey» and «dark iron-grey»] | 9751 | mineral : quartz<br>rock : light pink, translucid<br>powder : very light grey<br>origin : unknown<br><br>production process:<br>(followed from «greyish brown»)<br>1600 °F / 1 h (semiopaque white) / rock irradiated with gamma rays at 424.7 Mrad |
| iron-grey [between «medium iron-grey» and «dark iron-grey»] | 9752 | mineral : smaltite[25], variety of skutterudite<br>rock : dark iron-grey, with silver metallic brilliance<br>powder : dark grey<br>origin : Cobalt, Ontario<br><br>production process:<br>(followed from «dark iron-grey»)<br>1 g of smaltite + 1 g of sodium carbonate / 1800 °F / 1 h (medium iron-grey) / irradiated with gamma rays at 424.7 Mrad |
| | | mineral : chalcocite<br>rock : dark iron-grey (with localized turquoise oxidation)<br>powder : dark iron-grey<br>origin : Butte, Montana, United States |

1832

| | | |
|---|---|---|
| iron-grey a bit more pale than «dark iron-grey» | 9753 | production process:<br>0↑1900 °F (dark iron-grey) / powder irradiated with electrons at 302,831 rad[36] |
| dark iron-grey | 9754 | mineral : crocidolite<br>rock : dark greyish blue<br>powder : pale greyish blue<br>origin : Griqualand district, South Africa<br><br>production process:<br>4 g of crocidolite + 50 ml phosphoric acid / soaking: 2 wk. / drying on hot plate (still humid) / colour of the solid[37] |
| dark iron-grey | 9755 | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : unknown<br><br>production process:<br>1 g of antigorite + 1 g of sodium carbonate + 1 g of sulphur / 1700 °F / 1 h<br>(followed at «mossy green») |
| | | mineral : calcite[11]<br>powder : white<br>origin : Calcite du Nord Company, Saint-Eugène de Mistassini, Lac Saint-Jean, Québec<br><br>production process:<br>10 g of calcite + 10 g of SiC: |
| light iron-grey | 9756 | 0↑1200 °F |
| which | 9757 | 0↑1500 °F |
| darkens | 9758 | 0↑1600 °F |
| towards | 9759 | 0↑1700 °F |
| ↓ | 9760 | 0↑1800 °F |
| dark iron-grey | 9761 | 0↑1900 °F |
| | | mineral : chalcocite<br>rock : dark iron-grey (with localized turquoise oxidation)<br>powder : dark iron-grey<br>origin : Butte, Montana, United States |

| | | |
|---|---|---|
| dark iron-grey<br>↓<br>dark iron-grey | 9762<br><br>9763 | <u>production process:</u><br>0↑1600 °F<br><br>0↑1900 °F |
| dark iron-grey | 9764 | mineral : chalcocite<br>rock : dark iron-grey (with localized turquoise oxidation)<br>powder : dark iron-grey<br>origin : Butte, Montana, United States<br><br>mineral : sulphur<br>rock : brilliant yellow<br>powder : brilliant yellow<br>origin : unknown<br><br><u>production process:</u><br>(followed from «dark chocolate-brown»)<br>2 g of chalcocite + 2 g of sulphur / 1500 °F / 1 h |
| dark iron-grey | 9765 | mineral : chromite<br>rock : blackish grey<br>powder : medium brownish grey<br>origin : Black Lake, near Thetford Mines, Québec<br><br><u>production process:</u><br>0↑1900 °F (medium chocolate-brown): 1 g + 50 ml sulphuric acid / soaking: 2 wk. / drying on hot plate (profound green) / irradiated with gamma rays at 64.7 Mrad[1224]<br>(followed at «mixture of particles: mossy green / white / beige / iron-grey») |
| dark iron-grey | 9766 | mineral : cement[82]<br>powder : medium cold grey<br>origin : Union des Carrières, Limoilou, Québec<br><br><u>production process:</u><br>50 g of cement + 100 ml phosphoric acid / soaking: 3 wk. / drying on hot plate (still humid) |
| dark iron-grey | 9767 | mineral : copper<br>rock : reddish brown, with metallic luster<br>powder : reddish brown, with metallic luster<br>origin : unknown<br><br><u>production process:</u><br>50 g of copper + 100 ml sulphuric acid / soaking: 5 months / natural drying, completed on hot plate |

1834

| | | |
|---|---|---|
| dark iron-grey | 9768 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br>production process:<br>(followed from «dark coal-grey [light violet tone]»)<br>1 g of fluorine + 1 cc of synthetic white transparent enamel paint used for the car / manual grinding / application on a piece of steel sheet used for the car's body measuring 1" x 1" (light grey) / irradiated with gamma[351,352,1225] rays at 360 Mrad |
| dark iron-grey<br>↓<br>dark iron-grey | 9769<br><br>9770 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br>production process:<br>(followed from «dark greyish brown»)<br>2 g of goethite + 4 g of potassium carbonate + 2 g of sulphur:<br>0↑1700 °F<br><br>0↑1750 °F<br>(followed at «dark greyish brown»[2 g / 6 g / 2 g]) |
| dark iron-grey | 9771 | production process:<br>(followed from «greyish brown darker than "dark greyish brown"»)<br>2 g of goethite + 6 g of potassium carbonate + 2 g of sulphur / 0↑1750 °F |
| dark iron-grey<br>↓<br>dark iron-grey | 9772<br><br>9773 | production process:<br>(followed from «greyish brown darker than "dark greyish brown"»)<br>2 g of goethite + 2 g of potassium carbonate + 2 g of sulphur:<br>0↑1700 °F<br><br>0↑1800 °F<br>(followed at «dark greyish brown»[2 g / 4 g / 2 g]) |
| | | mineral : almandite<br>rock : dark brownish red<br>powder : medium brownish red<br>origin : Gore Mountain, Warren county, state |

| | | |
|---|---|---|
| | | of New York, United States |
| dark iron-grey | 9774 | production process:<br>0↑1900 °F<br>(followed at «dark iron-grey [light Burgundy-red reflection]») |
| dark iron-grey<br>↓<br>still darker iron-grey | 9775<br><br>9776 | mineral : haematite<br>rock : medium chocolate-brown<br>powder : medium chocolate-brown<br>origin : Nouveau Québec, Québec<br><br>mineral : sulphur<br>rock : brilliant yellow<br>powder : brilliant yellow<br>origin : unknown<br><br>production process:<br>(followed from «very dark greyish brown»)<br>2 g of haematite + 2 g of sulphur / 1600 °F / 1 h<br><br>2 g of haematite + 2 g of sulphur / 1700 °F / 1 h |
| dark iron-grey | 9777 | mineral : haematite<br>rock : dark brown (light red tone)<br>powder : dark brown (light red tone)<br>origin : Shefferville, Ungava, Québec<br><br>production process:<br>0↑2000 °F |
| dark iron-grey | 9778 | mineral : magnetite<br>rock : dark grey, with metallic brilliance<br>powder : dark grey<br>origin : Fosse du Labrador, Québec<br><br>production process:<br>0↑1900 °F (dark chocolate-brown): 1 g + 50 ml sulphuric acid / soaking: 2 wk. / drying on hot plate (very dark brown, almost black) / irradiated with gamma rays at 70.4 Mrad<br>(followed at «orange-brown darker than "dark orange-brown"») |
| cold dark iron-grey | 9779 | production process:<br>(followed from «dark chocolate-brown»)<br>0↑2000 °F |
| | | mineral : ochre[111]<br>powder : dark reddish brown |

1836

| | | |
|---|---|---|
| | | origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>(followed from «dark brownish grey»)<br>1 g of ochre + 2 g of potassium carbonate + 1 g of sulphur: |
| dark iron-grey | 9780 | 0↑1700 °F |
| ↓ | | |
| dark iron-grey | 9781 | 0↑1750 °F |
| dark iron-grey | 9782 | <u>production process:</u><br>(followed from «dark brownish grey»)<br>2 g of ochre + 6 g of potassium carbonate + 2 g of sulphur / 1750 °F |
| dark iron-grey | 9783 | mineral : ochre[128]<br>powder : black<br>origin : Red Mill, in the suburbs of Cap-de-la-Madeleine, Québec<br><br><u>production process:</u><br>(followed from «blackish olive-green»)<br>2 g of ochre + 2 g of potassium carbonate /<br>0↑1750 °F |
| dark iron-grey | 9784 | mineral : ochre[128]<br>powder : black<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>(followed from «greyish brown darker and more grey than "dark greyish brown"»)<br>1 g of ochre + 2 g of potassium carbonate + 1 g of sulphur / 0↑1750 °F |
| | | mineral : pentlandite[102]<br>rock : dark iron-grey, with silver and golden yellow metallic brilliance<br>powder : dark iron-grey (pronounced brown tone)<br>origin : Inco Co., Sudbury, Ontario |

| | | |
|---|---|---|
| | | <u>production process:</u><br>(followed from «orange-brown»)<br>2 g of pentlandite + 2 g of sodium carbonate: |
| dark iron-grey | 9785 | 0↑1500 °F + 1 h at 1500 °F[1226] |
| still darker iron-grey | 9786 | 0↑1600 °F + 1 h at 1600 °F |
| still darker iron-grey | 9787 | 0↑1700 °F + 1 h at 1700 °F |
| dark iron-grey | 9788 | 0↑1800 °F + 1 h at 1800 °F |
| ↓ | | |
| still darker iron-grey | 9789 | 0↑1900 °F + 1 h at 1900 °F |
| | | <u>production process:</u> |
| dark iron-grey | 9790 | 0↑1900 °F |
| ↓ | | |
| dark iron-grey | 9791 | 0↑2000 °F |
| | | mineral : pyrolusite[101]<br>rock : black (light brown tone), mat<br>powder : black (light brown tone), mat<br>origin : probably Nova Scotia |
| | | <u>production process:</u> |
| dark iron-grey | 9792 | 20 g of pyrolusite + 75 ml nitric acid / soaking:<br>5 months / natural drying |
| | | mineral : pyrrhotite[276]<br>rock : dark greyish brown, with golden yellow metallic brilliance<br>powder : dark grey<br>origin : Inco Co., Sudbury, Ontario |
| | | mineral : sulphur<br>rock : brilliant yellow<br>powder : brilliant yellow<br>origin : unknown |
| | | <u>production process:</u> |
| cold and dark iron-grey | 9793 | 2 g of pyrrhotite + 2 g of sulphur / 1300 °F / 1 h |
| | | <u>production process:</u> |
| dark iron-grey | 9794 | 1000 °C / 1 h |
| | | mineral : nickeliferous pyrrhotite[23]<br>rock : dark iron-grey, with silver and golden yellow metallic brilliance |

| | | |
|---|---|---|
| | | powder : dark iron-grey<br>origin : Inco Co., Sudbury, Ontario<br><br>mineral : sulphur<br>rock : brilliant yellow<br>powder : brilliant yellow<br>origin : unknown<br><br><u>production process:</u> |
| cold and dark iron-grey | 9795 | 2 g of pyrrhotite + 2 g of sulphur / 1300 °F / 1 h |
| | | <u>production process:</u> |
| dark iron-grey | 9796 | 0↑1900 °F |
| ↓ | | |
| dark iron-grey | 9797 | 0↑2000 °F |
| | | mineral : serandite<br>rock : orange-pink or salmon (with more orange areas)<br>powder : pinkish white<br>origin : De-Mix quarry, North side of Mont Saint-Hilaire, Rouvile county, Québec<br><br><u>production process:</u> |
| dark iron-grey | 9798 | 2 g of serandite + 2 g of sodium carbonate / 0↑1500 °F + 1 h at 1500 °F (blackish brown) / irradiated with gamma[239] rays at 64.7 Mrad |
| | | mineral : smaltite[25], variety of skutterudite<br>rock : dark iron-grey, with silver metallic brilliance<br>powder : dark grey<br>origin : Cobalt, Ontario<br><u>production process:</u> |
| dark iron-grey | 9799 | 1 g of smaltite + 1 g of sodium carbonate / 1800 °F / 1 h (medium iron-grey) / irradiated with gamma rays at 64.7 Mrad (followed at «iron-grey [between "medium" and "dark iron-grey"]») |
| | | <u>production process:</u> |
| dark iron-grey | 9800 | 3 g of smaltite + 20 ml of a cyanide[255] solution (mixture of particles: pink / brown) / irradiated with gamma rays at 424.7 Mrad |
| | | <u>production process:</u> |
| dark iron-grey | 9801 | 1400 °F / 1 h |
| | | mineral : sphalerite<br>rock : dark brown, with silver metallic brilliance |

| | | |
|---|---|---|
| dark iron-grey | 9802 | powder : dark brownish grey<br>origin : Louvem Mine, near Val d'Or, Québec<br><br>production process:<br>4 g of sphalerite + 20 ml hydrochloric acid / soaking: 3 d. / drying on hot plate |
| dark iron-grey | 9803 | mineral : cobalt sulphide[597]<br>rock : dark grey, with metallic brilliance<br>powder : dark grey<br>origin : Cobalt, Ontario<br><br>production process:<br>2000 °F / 20 min.[1227] |
| cold and dark iron-grey | 9804 | mineral : nickel sulphide<br>rock : dark grey<br>powder : dark grey<br>origin : Sudbury, Ontario<br><br>production process:<br>0↑1000 °C |
| dark iron-grey | 9805 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>mineral : sulphur<br>rock : brilliant yellow<br>powder : brilliant yellow<br>origin : unknown<br><br>production process:<br>1 g of wilsonite + 1 g of sodium carbonate + 2 g of sulphur / 0↑1600 °F[1228] |
| dark iron-grey | 9806 | mineral : wilsonite, local variety of scapolite or wernerite<br>rock : grey (violet tone)<br>powder : light grey (lilac tone)<br>origin : Tetreault Mine, Montauban, Portneuf county, Québec<br><br>production process:<br>3 g of wilsonite + 80 ml phosphoric acid / soaking: 2 wk. / drying on hot plate (still humid) / colour of the liquid[1229] |

1840

| | | |
|---|---|---|
| dark iron-grey | 9806.1 | mineral : lapis lazuli<br>rock : dark ultramarine-blue<br>powder : pale ultramarine-blue<br>origin : Afghanistan<br><br>production process:<br>1 g of lapis lazuli + 6.50 g of glass powder (spruce pine batch) / manual grinding / deposited on a ceramic plate at the state of a biscuit / heating in a furnace 0↑1000 °C in ambient air / slow cooling in furnace |
| dark iron-grey [with brown areas] | 9807 | mineral : zincite<br>rock : mixture of areas: dark grey / orange-red<br>powder : medium milky chocolate-brown (red tone)<br>origin : Franklin, New Jersey, United States<br><br>production process:<br>2 g of zincite + 2 g of sodium carbonate / 0↑1600 °F + 1 h at 1600 °F (very dark and intense emerald-green [blue tone]) / irradiated with electrons at 162,431 rad |
| dark iron-grey | 9808 | production process:<br>(followed from «dark chocolate-brown»)<br>0↑1700 °F |
| iron-grey a bit darker than «dark iron-grey» | 9809 | mineral : haematite<br>rock : dark brown (light red tone)<br>powder : dark brown (light red tone)<br>origin : Shefferville, Ungava, Québec<br><br>production process:<br>0↑2000 °F (dark iron-grey) / powder irradiated with gamma²³⁹ rays at 64.7 Mrad<br>(followed at «iron-grey [light brown tone]») |
| iron-grey darker than «dark iron-grey»<br>↓ | 9810 | mineral : chalcocite<br>rock : dark iron-grey (with localized turquoise oxidation)<br>powder : dark iron-grey<br>origin : Butte, Montana, United States<br><br>production process:<br>rock irradiated with gamma⁴³³ rays at:<br>65.704 Mrad |
| much darker iron-grey [with accen- | 9811 | 124.704 Mrad |

1841

| | | |
|---|---|---|
| tuated golden particles] | | (followed at «blackish brown») |
| | | mineral : galena<br>rock : dark grey, with metallic brilliance<br>powder : dark grey, with metallic brilliance<br>origin : Trail, British Columbia<br><br>mineral : steatite<br>rock : light cold grey, slightly translucid; stick measuring 1/2" x 4 7/8" x 1/8" and weighing 15 g<br>powder : light grey<br>origin : East Broughton, Québec<br><br><u>production process:</u><br>(followed from «orange-beige») |
| iron-grey darker than «dark iron-grey»<br>↓ | 9812 | 4 g of galena powder deposited at the surface of a steatite stick / 1400 °F / 1 h (glaze: «orange on a stick of steatite which is «golden beige» at the surface and «dark iron-grey» at its depth) / irradiated with gamma rays at 64.7 Mrad / colour of the steatite stick at its depth<br><br>(followed at «dark greyish brown», at «brown» and «mat brownish grey») |
| iron-grey darker than «dark iron-grey» | 9813 | 4 g of galena powder deposited at the surface of a steatite stick / 1500 °F / 1 h (glaze: «orange» on a stick of steatite which is «golden beige» at the surface and «dark iron-grey» at its depth) / irradiated with gamma rays at 64.7 Mrad / colour of the steatite at its depth<br>(followed at «dark brownish grey», at «mat and marbled grey» and «brown») |
| | | mineral : magnetite<br>rock : dark grey, with metallic brilliance<br>powder : dark grey<br>origin : Fosse du Labrador, Québec<br><br><u>production process:</u><br>0↑2000 °F (dark cold iron-grey) / powder irradiated with gamma$^{239}$ rays at: |
| iron-grey darker than «dark iron-grey»<br>↓ | 9814 | 64.7 Mrad |
| iron-grey still darker than «dark iron-grey» | 9815 | 424.7 Mrad |

| | | |
|---|---|---|
| iron-grey colder [less brown] and darker than «dark iron-grey» | 9816 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>0↑2000 °F (dark iron-grey) / powder irradiated with gamma[239] rays at 64.7 Mrad<br>(followed at «iron-grey [brownish red tone]») |
| iron-grey darker than «dark iron-grey» | 9817 | mineral : smaltite[25], variety of skutterudite<br>rock : dark iron-grey, with silver metallic brilliance<br>powder : dark grey<br>origin : Cobalt, Ontario<br><br>production process:<br>1400 °F / 1 h (dark iron-grey) / powder irradiated with gamma[239] rays at 64.7 Mrad<br>(followed at «iron-grey [light brown tone]») |
| iron-grey darker than «dark iron-grey»<br>↓ | 9818 | mineral : nickeliferous pyrrhotite[23]<br>rock : dark iron-grey, with silver and golden yellow metallic brilliance<br>powder : dark iron-grey<br>origin : Co. Inco, Sudbury, Ontario<br><br>production process:<br>rock irradiated with gamma rays at:<br>5 Mrad |
| iron-grey a bit darker | 9819 | 10 Mrad[1230]<br>(followed at «brownish grey darker than "dark brownish grey"») |
| iron-grey darker than «dark iron-grey» | 9820 | production process:<br>powder irradiated with gamma rays at 64.7 Mrad<br>(followed at «dark iron-grey [brown tone]») |
| iron-grey much darker than «dark iron-grey» | 9821 | production process:<br>0↑2000 °F (dark iron-grey) / powder irradiated with gamma[239] rays at 64.7 Mrad<br>(followed at «iron-grey [light brown reflection]») |
| iron-grey much darker than «dark | 9822 | production process:<br>0↑1900 °F (dark iron-grey) / powder irradiated with gamma rays at 64.7 Mrad |

| | | |
|---|---|---|
| iron-grey» | | (followed at «blackish grey [light violet-brown reflection]») |
| iron-grey a bit more pale than «very dark iron-grey [almost black]» | 9823 | mineral : chalcopyrite<br>rock : brass-yellow, with metallic luster<br>powder : dark grey (with golden particles)<br>origin : Noranda Mines, Noranda, Abitibi, Québec<br><br>production process:<br>1000 °C / 1 h (very dark iron-grey [almost black]) / powder irradiated with gamma[239] rays at 64.7 Mrad<br>(followed at «iron-grey [brown tone]») |
| iron-grey a bit lighter than «very dark iron-grey [almost black]») | 9824 | mineral : pyrrhotite[276]<br>rock : dark greyish brown, with golden yellow metallic brilliance<br>powder : dark grey<br>origin : Inco Co., Sudbury, Ontario<br><br>production process:<br>1000 °C / 1 h (dark iron-grey) / powder irradiated with gamma rays at 64.7 Mrad<br><br>(followed at «very dark greyish brown») |
| very dark iron-grey [almost black] | 9825 | mineral : chalcopyrite<br>rock : brass-yellow, with metallic luster<br>powder : dark grey (with golden particles)<br>origin : Noranda Mines, Noranda, Abitibi, Québec<br><br>production process:<br>1000 °C / 1 h |
| | | mineral : coal<br>rock : black<br>powder : brownish black<br>origin : bank of Saint-Lawrence river, city of Québec, Québec<br><br>mineral : sulphur<br>rock : brilliant yellow<br>powder : brilliant yellow<br>origin : unknown |

1844

| | | |
|---|---|---|
| very dark iron-grey [almost black] | 9826 | production process:<br>2 g of coal + 2 g of sulphur / 1300 °F / 1 h |
| very dark iron-grey [almost black] | 9827 | mineral : galena<br>rock : dark grey, with metallic brilliance<br>powder : dark grey, with metallic brilliance<br>origin : Trail, British Columbia<br><br>production process:<br>(followed from «brownish grey more grey and much darker than "medium brownish grey"»)<br>15 g of galena + 100 ml hydrochloric acid / soaking: 24 h / drying on hot plate (medium brownish grey) / irradiated with gamma[239] rays at 424.7 Mrad |
| very dark iron-grey [almost black] | 9828 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>(followed from «reddish brown darker than "dark reddish brown"»)<br>2 g of pentlandite + 2 g of sodium carbonate: 1800 °F / 1 h |
| ↓ very dark iron-grey [almost black] | 9829 | 1900 °F / 30 min. |
| blackish iron-grey more vivid and luminous than «very dark iron-grey [almost black]» | 9830 | production process:<br>2 g of pentlandite + 2 g of sodium carbonate / 1800 °F / 1 h (very dark iron-grey [almost black]) / irradiated with gamma[239] rays at:<br>64.7 Mrad |
| ↓ still more blackish iron-grey | 9831 | 424.7 Mrad |

1845

| mixture of particles | | |
|---|---|---|
| pale iron-grey / pale beige / white | 9832 | mineral : sodalite<br>rock : light cold blue<br>powder : light grey (light blue tone)<br>origin : Bancroft, Ontario<br><br>production process:<br>(followed from «pale pinkish brown [grey reflection]»)<br>2 g of sodalite + 2 g of sodium carbonate / 0↑1500 °F + 30 min. at 1500 °F (light beige) / irradiated with gamma rays at 424.7 Mrad |
| light iron-grey / light beige | 9833 | mineral : tremolite<br>rock : medium brown (evergreen tone)<br>powder : greyish beige<br>origin : Tetreault Mine, Montauban, Portneuf county, Québec<br><br>production process:<br>(followed from «shale-brown»)<br>2 g of tremolite + 2 g of sodium carbonate / 0↑1900 °F + 1 h at 1900 °F (grass-green) / irradiated with gamma[239] rays at 423.88 Mrad |
| iron-grey / brown | 9834 | mineral : halite[41]<br>rock : colourless<br>powder : colourless<br>origin : Seleine Mine, Iles-de-la-Madeleine, Québec<br><br>production process:<br>(followed from «mixture of particles: iron-grey [blue reflection] / brown»)<br>granules[1232] irradiated with gamma rays at:<br>14 Mrad<br><br>(followed at «mixture of particles: iron-grey [blue reflection] / brown»)<br><br>(followed at «mixture of particles: light iron-grey [blue reflection] / brown») |
| medium iron-grey / medium brown | 9835 | 91.304 Mrad |
| medium iron-grey / medium brown | 9836 | 129.688 Mrad |
| ↓ dark iron-grey / beige / orange / brown | 9837 | 155.288 Mrad |

| | | |
|---|---|---|
| dark iron-grey / white | 9838 | mineral : hypersthene<br>rock : black<br>powder : medium brownish grey<br>origin : Lac Saint-Jean, Québec<br><br><u>production process:</u><br>(followed from «mixture of particles: dark grey or dark bluish grey / rusty brown / white») 2 g of hypersthene + 2 g of sodium carbonate / 0↑1500 °F + 1 h at 1500 °F (orange [light brown tone]) / irradiated with gamma rays at 423.88 Mrad |
| dark iron-grey / light beige / light milky chocolate-brown | 9839 | <u>production process:</u><br>0↑2000 °F (mixture of particles: white [yellow reflection] / brown) / powder irradiated with electrons at 302,831 rad[36] |
| dark iron-grey / orange-brown / medium milky chocolate-brown | 9840 | mineral : sphalerite[27]<br>rock : dark grey, with golden yellow metallic brilliance<br>powder : dark brownish grey<br>origin : Matagami Mine, Matagami, Québec<br><br><u>production process:</u><br>(followed from «mixture of particles: creamy yellow / grass-green [grey tone]») 4 g of sphalerite + 25 ml nitric acid / soaking: 3 d. / separation of the liquid (1st) and the solid / soaking: 3 d. / separation in 3 parts: a) liquid (2nd) at the surface; b) layer in the middle: a mixture of the liquid and solid; c) the residual solid at the bottom of the solution / natural drying (colour of c) the residual solid: light yellow [very light green tone]) / irradiated with gamma rays at 424.7 Mrad |
| iron-grey (lilac tone) | | |
| iron-grey (light lilac tone) more intense than «light iron-grey (lilac tone)» | 9841 | mineral : fluorine<br>rock : pale grey (lilac tone), opaque<br>powder : pale grey (light lilac tone)<br>origin : Saint-Lawrence Fluorspar Company, Saint-Lawrence, Newfoundland<br><u>production process:</u><br>(followed from «medium iron-grey») 1 g of fluorine + 1 cc of synthetic white transparent enamel paint used for the car / manual grinding / application on a piece of steel sheet used for the car's body measuring 1" x 1" (light grey) / irradiated with gamma[351] rays at 10 Mrad (followed at «dark violet») |

| | | |
|---|---|---|
| medium iron-grey (light lilac tone) | 9842 | mineral : fluorine<br>rock : very pale yellow, translucid<br>powder : white (light yellow reflection)<br>origin : Ohio, United States<br><br><u>production process</u>:<br>(followed from «greyish blue»)<br>1 g of fluorine + 1 cc of synthetic white transparent enamel paint used for the car / manual grinding / application on a piece of steel sheet used for the car's body measuring 1" x 1" (greyish cream) / irradiated with gamma[351,352] rays at 5 Mrad<br>(followed at «dark violet, fairly accentuated») |
| iron-grey (violet tone) | | |
| iron-grey (light violet tone) | 9843 | mineral : goethite[106]<br>powder : rusty orange<br>origin : Red Mill, in the suburbs of Cap-de-la-Madeleine, Québec<br><br><u>production process</u>:<br>(followed from «dark grey [light violet tone]»)<br>0↑1400 °F / slow cooling in furnace (indian red[107]) / 1800 °F / 1 h |
| iron-grey (violet tone) | 9844 | mineral : ochre[111]<br>powder : dark reddish brown<br>origin : Red Mill, in the suburbs of Cap-de-la-Madeleine, Québec<br><br>mineral : halite[41]<br>rock : colourless<br>powder : colourless<br>origin : Seleine Mine, Iles-de-la-Madeleine, Québec<br><u>production process</u>:<br>(followed from «violet-brown [grey tone]»)<br>1 g of ochre + 2 g of halite / 0↑1750 °F / slow cooling in furnace |
| dark iron-grey (violet tone) | 9845 | <u>production process</u>:<br>(followed from «greyish brown [violet tone]»)<br>1 g of ochre + 3 g of halite / 0↑1750 °F / slow cooling in furnace |
| iron-grey (blue tone) | | |
| | | mineral : fluorine<br>rock : very light fluor-green (cold mint-green type), translucid<br>powder : very light grey |

1848

| | | |
|---|---|---|
| medium iron-grey (very light blue reflection) | 9846 | origin : Rogers Mine, Madoc, Ontario<br><br><u>production process:</u><br>(followed from «greyish green more intense than "greyish green"»)<br>1 g of fluorine + 1 cc of synthetic white transparent enamel paint used for the car / manual grinding / application on a piece of steel sheet used for the car's body measuring 1" x 1" (light yellow-beige) / irradiated with gamma rays at 18.85 Mrad (followed at «bluish grey more intense than "bluish grey"») |
| medium iron-grey (light indigo-blue reflection) | 9847 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>mineral : cement[1138]<br>powder : white<br><br><u>production process:</u><br>powder finely grinded and heated 0↑1100 °F (Naples yellow [green tone]): .50 g + 15 ml hydrochloric acid / soaking: 2 d. / drying on hot plate (very intense blue): .15 g + 16 cc of polymer used for concrete + 0.18 cc of catalyst + 1.50 thousandth of a g of cobalt 6% + 2 g of cement / manual grinding / moulding / hardening (medium iron-grey [light beige tone]) / irradiated with gamma rays at 18.85 Mrad |
| mixture of particles | | |
| iron-grey (fairly pronounced blue tone) / fairly pronounced brown<br>↓ | 9848 | mineral : halite[41]<br>rock : colourless<br>powder : colourless<br>origin : Seleine Mine, Iles-de-la-Madeleine, Québec<br><br><u>production process:</u><br>(followed from «mixture of particles: bluish grey tone / beige tone»)<br>granules[1234] irradiated with gamma rays at:<br>4.1 Mrad<br><br>(followed at «mixture of particles: iron-grey / brown»)<br>(followed from «mixture of particles: iron-grey / brown») |

| | | |
|---|---|---|
| light iron-grey (blue reflection) / brown | 9849 | 65.704 Mrad<br>(followed at «mixture of particles: medium iron-grey / medium brown») |
| iron-grey (green tone) | | |
| medium iron-grey (localized green reflection) | 9850 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>2 g of molybdenite + 2 g of sodium carbonate / 0↑900 °F + 1 h at 900 °F (light greenish yellow or yellowish green) / irradiated with electrons at 302,831 rad[45] |
| dark iron-grey (light green tone) | 9851 | mineral : chromite<br>rock : blackish grey<br>powder : medium brownish grey<br>origin : Black Lake, near Thetford Mines, Québec<br><br>production process:<br>4 g of chromite + 80 ml sulphuric acid / soaking: 2 wk. / drying on hot plate (mint-green [intense malachite-green type]) / irradiated with gamma rays at 64.7 Mrad<br>(followed at «mixture of particles: orange-beige / beige / brown / grey») |
| iron-grey (pink tone) | | |
| light iron-grey (light pink tone)<br>↓ | 9852 | mineral : ochre[111]<br>powder : dark reddish brown<br>origin : Red Mill, in the suburbs of Cap-de-la-Madeleine, Québec<br><br>mineral : titanium dioxide<br>powder : white<br>origin : NL Chem Canada Inc., Québec<br><br>production process:<br>1 g of ochre + 1 g of titanium dioxide:<br>0↑ 700 °F |
| darker iron-grey (light pink tone) | 9853 | 0↑1000 °F<br>(followed at «brownish grey [light pink tone]») |

1850

| | | |
|---|---|---|
| light iron-grey (light pink tone) | 9854 | production process:<br>1 g of ochre + 2 g of titanium dioxide:<br>0↑ 500 °F |
| ↓ | | |
| darker iron-grey (light pink tone) | 9855 | 0↑ 700 °F |
| ↓ | | |
| still darker iron-grey (light pink tone) | 9856 | 0↑ 900 °F |
| ↓ | | |
| still darker iron-grey (light pink tone) | 9857 | 0↑1000 °F<br>(followed at «light pinkish lilac [very light grey tone]») |
| dark iron-grey (light pink tone) | 9858 | mineral : pyrite<br>rock : pale brass-yellow, with metallic brilliance<br>powder : brownish grey (with golden yellow particles)<br>provenance: Noranda Mines, Noranda, Abitibi, Québec<br><br>production process:<br>1300 °F / 1 h |
| iron-grey (red tone) | | |
| iron-grey (light red reflection), more pale than «dark iron-grey (red tone)» | 9859 | mineral : almandite<br>rock : dark brownish red<br>powder : medium brownish red<br>origin : Gore Mountain, Warren county, state of New York, United States<br><br>production process:<br>0↑2000 °F (dark iron-grey [light Burgundy-red reflection]) / powder irradiated with gamma²³⁹ rays at 64.7 Mrad<br>(followed at «iron-grey [dimished red reflection], almost black») |
| dark iron-grey (light Burgundy red reflection) | 9860 | production process:<br>(followed at «dark iron-grey»)<br>0↑2000 °F |
| iron-grey (dimi- | 9861 | production process:<br>(followed from «iron-grey [light red reflection], more pale than "dark iron-grey [red tone]"»)<br>0↑2000 °F (dark iron-grey [light Burgundy-red re- |

1851

| | | |
|---|---|---|
| nished red tone) a bit darker [almost black] than «dark iron-grey (red tone)» | | flection]) / powder irradiated with gamma[239] rays at 424.7 Mrad |
| iron-grey (brownish red tone) | | |
| iron-grey (brownish red tone) much darker than «dark iron-grey (brownish red tone)» | 9862 | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br><u>production process:</u><br>(followed from «iron-grey colder and darker than "dark iron-grey"»)<br>0↑2000 °F (dark iron-grey) / powder irradiated with gamma[239] rays at 424.7 Mrad[1235] |
| iron-grey (beige tone) | | |
| light iron-grey (localized beige reflection) | 9863 | mineral : pyrophillite<br>rock : light beige (grey and pink tones), opaque<br>powder : very light beige (grey and orange-pink tones)<br>origin : Carpentier district, Abitibi, Québec<br><br><u>production process:</u><br>2 g of pyrophillite + 2 g of sodium carbonate / 0↑1500 °F + 1 h at 1500 °F (very light beige) / irradiated with gamma[262] rays at 423.88 Mrad |
| iron-grey (brown tone) | | |
| iron-grey (diminished brown tone) more pale and colder than | 9864 | mineral : iron pyrite<br>powder : greyish brown, with golden yellow metallic brilliance<br>origin : Rigaud seigniory, Beauce county, Québec<br><br><u>production process:</u><br>4 g of pyrite + 25 ml nitric acid / soaking: 3 d. / drying on hot plate (light iron-grey [very light brown]) / irradiated with gamma rays at 63.88 Mrad |

| | | |
|---|---|---|
| «light iron-grey (brown tone)» | | (followed at «medium greyish beige») |
| light iron-grey (very light brown tone) | 9865 | <u>production process:</u><br>4 g of pyrite + 25 ml nitric acid / soaking: 3 d. / drying on hot plate |
| iron-grey (brown tone a bit more acute) darker than «light iron-grey (brown tone)» | 9866 | <u>production process:</u><br>4 g of pyrite + 25 ml nitric acid / soaking: 3 d. / drying on hot plate (light iron-grey [very light brown tone]) / irradiated with electrons at 302,831 rad[36] |
| dark iron-grey (brown reflection) | 9867 | mineral : fluorine<br>rock : white (pink reflection), translucid<br>powder : white (grey reflection)<br>origin : Saint-Lawrence Fluorspar Company, Saint-Lawrence, Newfoundland<br><br>mineral : cement[1138]<br>powder : white<br><br><u>production process:</u><br>5 g of rocks of various sizes + 13.74 g of cement + 6.50 cc of water / manual mixing / moulding / 0↑1300 °F / cooling / irradiated with gamma rays at 18.85 Mrad<br>(followed at «lapis lazuli-blue») |
| dark iron-grey (brown reflection) | 9868 | mineral : bornite<br>rock : reddish brown (with localized green and bluish green oxidation)<br>powder : reddish brown<br>origin : Lac Musset, Fosse du Labrador, Québec<br><br><u>production process:</u><br>(followed from «greenish beige»)<br>2 g of bornite + 25 ml hydrochloric acid / soaking: 6 d. / separation of the liquid and the solid / natural drying (colour of the solid: light yellowish green) / irradiated with gamma rays at 425.65 Mrad |
| | | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><u>production process:</u><br>rock irradiated with gamma[228] rays at: |

| | | |
|---|---|---|
| dark iron-grey ↓ which darkens and becomes more brown | 9869 | 5 Mrad |
| | 9870 | 10 Mrad |
| | 9871 | 57.4 Mrad[1236] |
| | 9872 | 65.704 Mrad |
| | 9873 | 102.4 Mrad |
| | 9874 | 124.704 Mrad[1237] |
| | | (followed at «brownish grey») |
| | | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>(followed from «iron-grey darker than "dark iron-grey"») |
| dark iron-grey (brown tone) | 9875 | powder irradiated with gamma[239] rays at 424.7 Mrad |
| | | mineral : pentlandite[102]<br>rock : dark iron-grey, with silver and golden yellow metallic brilliance<br>powder : dark iron-grey (pronounced brown tone)<br>origin : Inco Co., Sudbury, Ontario<br><br>production process:<br>powder irradiated with gamma[239] rays at: |
| iron-grey (brown tone) a bit darker than «dark iron-grey (brown tone)» ↓ | 9876 | 64.7 Mrad |
| iron-grey (brown tone) still a bit darker | 9877 | 424.7 Mrad |
| | | mineral : pyrite<br>rock : pale brass-yellow, with metallic brilliance<br>powder : brownish grey (with golden yellow particles)<br>provenance: Noranda Mines, Noranda, Abitibi, Québec<br><br>production process: |
| iron-grey (brown tone) a bit darker than «dark iron-grey (brown tone)» | 9878 | 1300 °F / 1 h (dark iron-grey [light pink tone]) / powder irradiated with gamma[81,239] rays at 424.7 Mrad |

| | | |
|---|---|---|
| iron-grey (brown tone) a bit darker than «dark iron-grey (brown tone)» | 9879 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>mineral : sulphur<br>rock : brilliant yellow<br>powder : brilliant yellow<br>origin : unknown<br><br><u>production process:</u><br>2 g of pyrrhotite + 2 g of sulphur / 1300 °F / 1 h (cold and dark iron-grey) / irradiated with gamma[81,239] rays at 424.7 Mrad |
| | | mineral : chalcocite<br>rock : dark iron-grey (with localized turquoise oxidation)<br>powder : dark iron-grey<br>origin : Butte, Montana, United States<br><br><u>production process:</u><br>powder irradiated with gamma[239] rays at: |
| iron-grey darker than «dark iron-grey» | 9880 | 5 Mrad |
| ↓ | 9881 | 10 Mrad |
| ↓ | 9882 | 57.4 Mrad |
| which | 9883 | 64.7 Mrad |
| ↓ | 9884 | 102.4 Mrad |
| evolves towards | 9885 | 148.4 Mrad |
| ↓ | 9886 | 201.6 Mrad |
| ↓ | 9887 | 247.6 Mrad |
| ↓ | 9888 | 287.3 Mrad |
| blackish brown | 9889 | 360 Mrad<br>(followed at «blackish brown») |
| | 9890 | mineral : tungsten or wolframite<br>rock : dark grey with metallic brilliance<br>origin : Burnt Hill Tungsten Mine, region of Bathurst, New Brunswick<br><br><u>production process:</u><br>rock irradiated with gamma rays at: |
| iron-grey (light brown tone) darker than «dark iron-grey (light brown tone)» | 9891 | 57.4 Mrad |
| ↓ | 9892 | 63.984 Mrad |
| which darkens and | 9893 | 102.4 Mrad |

1855

| | | |
|---|---|---|
| ↓ becomes more ↓ brown | 9894<br>9895<br>9896<br>9897<br>9898<br>9899 | 122.984 Mrad<br>148.4 Mrad<br>201.6 Mrad<br>247.6 Mrad<br>287.3 Mrad<br>360 Mrad<br>(followed at «dark chocolate-brown») |
| iron-grey (light brown tone) much darker than «dark iron-grey (brown tone)» | 9900 | mineral : haematite<br>rock : dark brown (light red tone)<br>powder : dark brown (light red tone)<br>origin : Shefferville, Ungava, Québec<br><br>production process:<br>(followed from «iron-grey a bit darker than "dark iron-grey"»)<br>0↑2000 °F (dark iron-grey) / powder irradiated with gamma rays at 424.7 Mrad |
| iron-grey (light brown tone) much darker than «dark iron-grey (brown tone)» | 9901 | mineral : smaltite[25], variety of skutterudite<br>rock : dark iron-grey, with silver metallic brilliance<br>powder : dark grey<br>origin : Cobalt, Ontario<br><br>production process:<br>(followed from «iron-grey darker than "dark iron-grey"»)<br>1400 °F / 1 h (dark iron-grey) / powder irradiated with gamma[239] rays at 424.7 Mrad |
| iron-grey (light brown reflection) still darker than «iron-grey (brown tone) much darker than "dark iron-grey (brown tone)"» | 9902 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>(followed from «iron-grey much darker than "dark iron-grey"»)<br>0↑2000 °F (dark iron-grey) / powder irradiated with gamma[239] rays at 424.7 Mrad |

| | | |
|---|---|---|
| very dark iron-grey (light brown tone) | 9903 | mineral : malachite<br>rock : ribboned variety of pronounced mint-green<br>powder : light and brilliant mint-green<br>origin : province du Katanga, at 300 km from Lubumbachai, Zaïr, Africa<br><br>production process:<br>(followed from «mossy greenish turquoise more green and more accentuated than "light and brilliant mossy greenish turquoise"»)<br>1 g of malachite + 2 ml ammonia / natural drying / (mossy greenish turquoise lighter than «greenish turquoise») / irradiated with gamma rays at 424.7 Mrad |
| iron-grey (brown tone) darker and more intense than «very dark iron-grey, almost black [brown tone]») | 9904 | mineral : chalcopyrite<br>rock : brass-yellow, with metallic brilliance<br>powder : dark grey (with golden particles)<br>origin : Noranda Mines, Noranda, Abitibi, Québec<br><br>production process:<br>(followed from «iron-grey a bit more pale than "very dark iron-grey [almost black]"»)<br>1000 °C / 1 h (very dark iron-grey [almost black]) / powder irradiated with gamma[239] rays at 424.7 Mrad |
| iron-grey (light brown tone) darker than «very dark iron-grey, almost black [brown tone]» | 9905 | mineral : coal<br>rock : black<br>powder : brownish black<br>origin : bank of Saint-Lawrence river, city of Québec, Québec<br><br>mineral : sulphur<br>rock : brilliant yellow<br>powder : brilliant yellow<br>origin : unknown<br><br>production process:<br>2 g of coal + 2 g of sulphur / 1300 °F / 1 h (very dark iron-grey [almost black]) / irradiated with gamma rays at 424.7 Mrad[81,239] |

1857

| | | |
|---|---|---|
| iron-grey (violet-brown tone) | | |
| iron-grey (violet -brown tone) | 9906 | mineral : ochre[111]<br>powder : dark reddish brown<br>origin : Red Mill, in the suburbs of Cap-de-la -Madeleine, Québec<br><br>mineral : halite[41]<br>rock : colourless<br>powder : colourless<br>origin : Seleine Mine, Iles-de-la-Madeleine, Québec<br><br>production process:<br>(followed from «greyish brown [violet-red tone]») 1 g of ochre + 1 g of halite / 0↑1750 °F / slow cooling in furnace |
| iron-grey (pinkish brown tone) | | |
| medium iron-grey (brown tone and light pink reflection) | 9907 | mineral : smaltite[25], variety of skutterudite<br>rock : dark iron-grey, with silver metallic brilliance<br>powder : dark grey<br>origin : Cobalt, Ontario<br><br>mineral : sulphur<br>rock : brilliant yellow<br>powder : brilliant yellow<br>origin : unknown<br><br>production process:<br>2 g of smaltite + 2 g of sulphur / 1300 °F / 1 h |
| iron-grey (brown tone and pink reflection) a bit darker than «medium iron-grey (brown tone and pink reflection)» | 9908 | production process:<br>2 g of smaltite + 2 g of sulphur / 1300 °F / 1 h (medium iron-grey [brown tone and light pink reflection]) / irradiated with gamma[81,239] rays at 424.7 Mrad |
| iron-grey (reddish brown tone) | | |
| | | mineral : pyrrhotite[276]<br>rock : dark greyish brown, with golden yellow metallic brilliance<br>powder : dark grey |

1858

| | | |
|---|---|---|
| | | origin : Inco Co., Sudbury, Ontario<br><br>mineral : sulphur<br>rock : brilliant yellow<br>powder : brilliant yellow<br>origin : unknown<br><br><u>production process:</u> |
| iron-grey (light reddish brown tone) still darker and more intense than «dark iron-grey (reddish brown tone)» | 9909 | 2 g of pyrrhotite + 2 g of sulphur / 1300 °F / 1 h (dark and cold iron-grey) / irradiated with gamma[81,239] rays at 424.7 Mrad |
| | | mineral : ilmenite<br>rock : blackish grey, with metallic luster<br>powder : blackish grey, with metallic luster<br>origin : Québec Fer et Titane Co., Havre Saint-Pierre, Québec<br><br>mineral : sulphur<br>rock : brilliant yellow<br>powder : brilliant yellow<br>origin : unknown<br><br><u>production process:</u> |
| very dark [almost black] iron-grey (reddish brown tone) | 9910 | 2 g of ilmenite + 2 g of sulphur / 1300 °F / 1 h |
| | | <u>production process:</u> |
| iron-grey (accentuated reddish brown tone) still darker than «very dark [almost black] iron-grey (reddish brown tone)» | 9911 | 2 g of ilmenite + 2 g of sulphur / 1300 °F / 1 h (very dark iron-grey, almost black [reddish brown tone]) / irradiated with gamma[81,239] rays at 424.7 Mrad |
| smoky grey | | |
| | | mineral : fluorine<br>rock : white (pink reflection), translucid<br>powder : white (grey reflection)<br>origin : Saint-Lawrence Fluorspar Company, Saint-Lawrence, Newfoundland<br><br><u>production process:</u> |
| light smoky grey tint | 9912 | rock irradiated with electrons at 155,082 rad |

| | | |
|---|---|---|
| very, very light smoky grey | 9913 | mineral : crystalline quartz<br>rock : colourless<br>origin : Ferme Adam, Bonsecours, Eastern Townships, Québec<br><br>production process:<br>rock hermetically wrapped in bread dough / 1600 °F / 1 h (transparent white) / irradiated with gamma rays at 64.7 Mrad (followed at «medium brownish grey [orange reflection]») |
| light smoky grey | 9914 | mineral : fluorine<br>rock : light pink, translucid<br>powder : white (light pink reflection)<br>origin : Saint-Lawrence Fluorspar Company, Saint-Lawrence, Newfoundland<br><br>production process:<br>rock irradiated with electrons at 155,082 rad |
| | | mineral : graphite<br>rock : dark grey, with metallic brilliance<br>powder : dark grey, with metallic brilliance<br>origin : Grenville, Québec<br><br>production process:<br>(followed from «dark grey [blue reflection]»)<br>2% of graphite is mixed with molten crystal/the entity is melted at 2,400 °F (light bluish turquoise type) / irradiated with gamma rays at: |
| smoky grey more accentuated than «light smoky grey»<br>↓ | 9914.1 | 7.41 Mrad |
| smo ky grey still slightly more accentuated | 9914.2 | 9.88 Mrad |
| smoky grey [with «green» traces] | 9915 | mineral : fluorine<br>rock : very light and luminous evergreen, translucid<br>origin : Poudrette quarry, Mont Saint-Hilaire, Québec<br><br>production process:<br>rock irradiated with gamma rays at 64.7 Mrad[1238]<br>(followed at «dark grass-green») |
| | | mineral : halite[41] |

1860

| | | |
|---|---|---|
| | | rock : colourless<br>powder : colourless<br>origin : Selaine Mine, Iles-de-la-Madeleine, Québec |
| smoky grey | 9916 | production process:<br>rock irradiated with gamma rays at 28.5 Mrad (brownish grey darker than «medium brownish grey») / removed from beam / entirely covered with 20 ml hydrochloric acid / soaking: 2 wk. / drying on sand bath, completed on hot plate |
| fairly pronounced smoky grey | 9917 | mineral : quartz<br>rock : light pink, translucid<br>powder : very light grey<br>origin : unknown<br><br>production process:<br>4 g of quartz + 40 ml nitric acid / soaking: 7 d. / separation of the liquid and the solid / natural drying (colour of the solid: white [green reflection]) / irradiated with gamma rays at 64.7 Mrad (followed at «light beige») |
| mixture of particles | | |
| smoky grey / orange (brown tone) | 9918 | mineral : agate<br>rock : grey (with a light orange circular area on the surface), slightly translucid<br>powder : very light grey<br>origin : unknown<br><br>production process:<br>3 g of agate + 40 ml nitric acid / soaking: 1 wk. / separation of the liquid and the solid / natural drying (colour of the solid: white [green reflection]) / irradiated with gamma rays at 64.7 Mrad (followed at «mixture of particles: beige of various tones») |
| smoky grey (blue tone) | | |
| | | mineral : graphite<br>rock : dark grey, with metallic brilliance<br>powder : dark grey, with metallic brilliance<br>origin : Grenville, Québec<br><br>production process:<br>2% of graphite is mixed with molten crystal and |

| | | |
|---|---|---|
| light smoky grey (blue reflection) ↓ more accentuated smoky grey (very light blue reflection) | 9918.1<br>9918.2 | the entity is melted at 2,400 °F (light bluish turquoise type) / irradiated with gamma rays at:<br>2.47 Mrad<br>4.94 Mrad<br>(followed at «smoky grey more accentuated than "light smoky grey"») |
| smoky grey (green tone) | | |
| smoky grey (green tone) | 9919 | mineral : anorthosite<br>rock : dark grey<br>powder : medium grey<br>origin : Jonquière, Lac Saint-Jean, Québec<br><br>production process:<br>6 g of anorthosite + 80 ml phosphoric acid / soaking: 2 wk. / drying on hot plate (still humid) / colour of the liquid[78] |
| smoky grey (amber tone) | | |
| smoky grey (amber tone) | 9919.1 | mineral : crystalline quartz<br>rock : colourless<br>origin : Ferme Adam, Bonsecours, Eastern Townships, Québec<br><br>production process:<br>the rock is deposited at -20 °C / 2 h / removed and immediately irradiated at this temperature with gamma rays at 2.26 Mrad[1278]<br>(followed at «medium brownish grey [orange reflection]») |
| coal-grey | | |
| coal-grey | 9920 | mineral : bornite<br>rock : reddish brown (with localized green and bluish green oxidation)<br>powder : reddish brown<br>origin : Lac Musset, Fosse du Labrador, Québec<br><br>production process:<br>(followed from «smoky black»)<br>rock irradiated with gamma rays at 424.7 Mrad |
| coal-grey (violet tone) | | |
| | | mineral : fluorine<br>rock : pale grey (lilac tone), opaque<br>powder : pale grey (light lilac tone) |

1962

| | | |
|---|---|---|
| dark coal-grey (light violet tone) | 9921 | origin : Saint-Lawrence Fluorspar Company, Saint-Lawrence, Newfoundland<br><br>production process:<br>(followed from «dark violet»)<br>1 g of fluorine + 1 cc of synthetic white transparent enamel paint for the car / manual grinding / application on a piece of steel sheet used for the car's body measuring 1" x 1" (light grey) / irradiated with gamma rays at 102.4 Mrad<br>(followed at «dark iron-grey») |

BLACKISH GREY

| colour obtained | number | mineral / production process |
|---|---|---|
| blackish grey | 9922 | mineral : amethyst<br>rock : violet, translucid<br>powder : light grey (lilac tone)<br>origin : Thunderbay, Ontario<br><br>mineral : sulphur<br>rock : brilliant yellow<br>powder : brilliant yellow<br>origin : unknown<br><br>production process:<br>.50 g of amethyst + .50 g of sodium carbonate + .50 g of sulphur / 1600 °F / 1 h[1239] |
| blackish grey | 9923 | mineral : chalcopyrite<br>powder : dark grey (light green tone)<br>origin : Centre de recherche des Mines Noranda in Montréal, Québec<br><br>production process:<br>1300 °F / 1 h |
| blackish grey | 9924 | mineral : chrysocolla<br>rock : light greenish turquoise<br>powder : very light greenish turquoise<br>origin : Mexico<br><br>mineral : sulphur<br>rock : brilliant yellow<br>powder : brilliant yellow<br>origin : unknown<br><br>production process:<br>2 g of chrysocolla + 2 g of sulphur / 1300 °F / 1 h |
| | | mineral : fluorine<br>rock : colourless<br>powder : colourless<br>origin : Ohio, United States<br><br>mineral : sulphur<br>rock : brilliant yellow |

| | | |
|---|---|---|
| blackish grey | 9925 | powder : brilliant yellow<br>origin : unknown<br><br>production process:<br>1 g of fluorine + 2 g of sodium carbonate + 1 g of sulphur / 1600 °F / 1 h |
| blackish grey | 9926 | mineral : galena<br>rock : dark grey, with metallic brilliance<br>powder : dark grey, with metallic brilliance<br>origin : Gisement Sullivan, COMINCO Co., Co-Trail, British Columbia<br><br>production process:<br>(followed from «grey much darker than "dark grey"»)<br>rock irradiated with gamma rays at 484.704 Mrad[228,1240] |
| blackish grey | 9927 | mineral : graphite<br>rock : dark grey, with metallic brilliance<br>powder : dark grey, with metallic briliance<br>origin : Grenville, Québec<br><br>mineral : sulphur<br>rock : brilliant yellow<br>powder : brilliant yellow<br>origin : unknown<br><br>production process:<br>1 g of graphite + 3 g of sodium carbonate + 1 g of sulphur / 0↑1600 °F |
| blackish grey | 9928 | production process:<br>1 g of graphite + 1 g of sodium carbonate + 2 g of sulphur / 0↑1600 °F[1241] |
| blackish grey | 9929 | production process:<br>1 g of graphite + 1 g of sodium carbonate + 1 g of sulphur / 1700 °F / 1 h[1242] |
| blackish grey | 9930 | production process:<br>2 g of graphite + 2 g of sulphur / 1300 °F (dark grey) / irradiated with gamma rays at 424.7 Mrad[81,239] |
| blackish grey | 9931 | mineral : graphite<br>rock : dark grey, with metallic brilliance<br>powder : dark grey, with metallic brilliance<br>origin : Grenville, Québec<br><br>production process:<br>powder irradiated with gamma rays at 424.7 |

1865

| | | |
|---|---|---|
| | | Mrad[81,239] |
| blackish grey | 9932 | mineral : haematite<br>rock : medium chocolate-brown<br>powder : medium chocolate-brown<br>origin : Nouveau Québec, Québec<br><br>production process:<br>0↑1800 °F (dark violet-brown): 4 g + 200 ml phosphoric acid / soaking: 4 years / drying on hot plate (still humid) / colour of the solid[1243] |
| blackish grey | 9933 | mineral : magnetite<br>rock : dark grey, with metallic brilliance<br>powder : dark grey<br>origin : Fosse du Labrador, Québec<br><br>production process:<br>0↑1900 °F (dark chocolate-brown): 1 g + 50 ml nitric acid / soaking: 2 wk. / drying on hot plate (mixture of particles: medium orange [brown tone] / blackish grey) / irradiated with gamma rays at 70.4 Mrad<br>(followed at «blackish grey [brown tone]») |
| blackish grey | 9934 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>4 g of pyrrhotite + 50 ml nitric acid / soaking: 2 wk. / separation of the liquid and the solid / natural drying (colour of the solid: white [light grey reflection]) / irradiated with electrons at 162,431 rad |
| blackish grey | 9935 | mineral : serandite<br>rock : beige (light pinkish orange tone), opaque<br>powder : light pink<br>origin : De-Mix quarry, North side of Mont Saint-Hilaire, Rouville county, Québec<br><br>production process:<br>12 g of serandite + 40 ml hydrochloric acid / natural drying (very vivid orange-yellow): .50 g + .50 g of sodium carbonate |
| | | mineral : siderite<br>rock : caramel-brown (grey tone) |

1866

| | | |
|---|---|---|
| blackish grey | 9936 | powder : light orange-beige<br>origin : De-Mix quarry, North side of Mont Saint-Hilaire, Rouville county, Québec<br><br>production process:<br>1000 °C / 1 h |
| blackish grey | 9937 | mineral : sodalite, hackmanite variety, fluorescent and phosphorescent<br>rock : crystals: very dark grey, almost black<br>origin : Poudrette quarry, Mont Saint-Hilaire, Québec<br><br>production process:<br>(followed from «grey darker than "very dark grey, almost black"»)<br>cristals irradiated with gamma[67,69] rays at 360 Mrad<br>(followed at «brownish grey a bit less dark than "blackish brown-grey"») |
| blackish grey<br>↓<br>grey still more black | 9938<br><br>9939 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br>production process:<br>rock hermetically wrapped in bread dough and heated at:<br>1600 °F / 30 min.[1244]<br><br>1600 °F / 1:30 h[1244] |
| blackish grey | 9940 | production process:<br>rock hermetically wrapped in bread dough / 1600 °F / 30 min. (blackish grey): 10 g + 80 ml nitric acid / soaking: 1 wk. / drying on hot plate / maintenance at the boiling point until completely dry / colour of the rock[1245] |
| blackish grey | 9941 | production process:<br>rock irradiated with a UV laser beam during 4 min. on a 0.40 cm² surface with a laser energy of 0.180 Joule having a flux of 1.3 x $10^7$ Watt / cm² to give a total energy of 432 Joules[1246] |

1867

| | | |
|---|---|---|
| | | production process: (followed from «very dark metallic grey») rock irradiated with gamma[228] rays at: |
| blackish grey | 9942 | 490.404 Mrad |
| ↓ | | |
| grey still more black | 9943 | 604.53 Mrad[1247] |

BLACK (GREY TONE)

| colour obtained | number | mineral / production process |
|---|---|---|
| black (grey reflection) | 9944 | mineral : chalcocite<br>rock : dark iron-grey<br>powder : dark iron-grey<br>origin : Butte, Montana, United States<br><br>production process:<br>0↑1900 °F (dark iron-grey) / powder irradiated with gamma rays at 64.7 Mrad<br>(followed at «blackish chocolate-brown») |
| grey-black less profound and colder than «grey-black» | 9945 | mineral : coal<br>rock : black<br>powder : brownish black<br>origin : bank of Saint-Lawrence river, city of Québec, Québec<br><br>production process:<br>powder irradiated with gamma[239,1248] rays at:<br>64.7 Mrad |
| ↓ grey-black less profound and colder than «grey-black» | 9946 | 424.7 Mrad |
| grey-black | 9947 | mineral : stibnite<br>rock : dark grey, with metallic brilliance<br>powder : dark grey, with metallic brilliance<br>origin : Hunan, China<br><br>production process:<br>(followed from «blackish metallic grey»)<br>powder irradiated with gamma rays at 424.7 Mrad |
| | | mineral : fuel oil soot[86]<br>powder : profound brownish black<br>origin : boiler room of Laval University, city of Québec, Québec |

1869

| | | |
|---|---|---|
| grey-black | 9948 | <u>production process:</u><br>2 g of soot + 20 ml hydrofluoric acid / soaking: 24 h / drying in drying oven at 100 ºF |
| grey-black | 9949 | mineral : tourmaline<br>rock : very dark grey, almost black<br>powder : very dark grey, almost black<br>origin : Villeneuve Mine, Papineau county, Québec<br><br><u>production process:</u><br>powder irradiated with gamma rays at 64.7 Mrad (followed at «brownish black more intense and profound than "brownish black"») |

BLACK

| colour obtained | number | mineral / production process |
|---|---|---|
| black (blue tone) | | |
| black (blue reflection) | 9950 | mineral : malachite<br>rock : ribboned variety of pronounced mint-green<br>powder : light and brilliant mint-green<br>origin : Katanga province, at 300 km of Lubumbachai, Zair, Africa<br>mineral : sulphur<br>rock : brilliant yellow<br>powder : brilliant yellow<br>origin : unknown<br>production process:<br>(followed from «grey darker than "dark grey"»)<br>2 g of malachite + 2 g of sulphur / 1500 °F / 1 h (dark grey) / irradiated with gamma rays at 424.7 Mrad |
| black (light blue reflection) | 9950.1 | mineral : smaltite[25], variety of skutterudite<br>rock : dark iron-grey, with silver metallic brilliance<br>powder : dark grey<br>origin : Cobalt, Ontario<br>production process:<br>(followed from «lapis lazuli-blue or ultramarine-blue [red reflection]»)<br>1 g of smaltite + 5 g of pyrex / manual grinding / heating: 5 °C per min. 0↑1245 °C + maintenance during 1 h / cooling: 5 °C per min. until ambient temperature is reached / the entity is done in ambient air (dark lapis lazuli-blue or dark ultramarine-blue [grey tone]) / irradiated with gamma rays at 7.41 Mrad<br>(followed at «black [accentuated greyish blue reflection]») |
| black (greyish blue tone) | | |
| | | mineral : smaltite[25], variety of skutterudite<br>rock : dark iron-grey, with silver metallic brilliance<br>powder : dark grey<br>origin : Cobalt, Ontario |

1871

| | | |
|---|---|---|
| black (accentuated greyish blue reflection) | 9950.2 | production process: (followed from «black [blue reflection]») 1 g of smaltite + 5 g of pyrex / manual grinding / heating: 5 °C per min. 0↑1245 °C + maintenance during 1 h / cooling: 5 °C per min. until ambient temperature is reached / the entity is done in ambient air (dark lapis lazuli-blue or dark ultramarine-blue [grey tone]) / irradiated with gamma rays at 9.88 Mrad |
| blue-black | 9951 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>0↑1900 °F (dark iron-grey): 1 g + 80 ml phosphoric acid / soaking: 2 wk. / drying on hot plate (still humid) / colour of the liquid[7] |
| black (green tone) | | |
| black (green reflection) | 9952 | mineral : coal<br>rock : black<br>powder : brownish black<br>origin : bank of Saint-Lawrence river, city of Québec, Québec<br><br>production process:<br>4 g of coal + 100 ml sulphuric acid / soaking: 3 months / drying on hot plate |
| black (green reflection) | 9953 | mineral : pyrophillite<br>rock : light beige (grey and pink tones), opaque<br>powder : very light beige (grey and orange-pink tones)<br>origin : Carpentier district, Abitibi, Québec<br><br>production process:<br>1 g of pyrophillite + 80 ml phosphoric acid / soaking: 2 wk. / drying on hot plate (still humid) / colour of the liquid[160] |
| black (rusty tone) | | |
| | | mineral : ochre[111]<br>powder : dark reddish brown |

1872

| | | |
|---|---|---|
| black (light rusty tone) | 9954 | origin : Red Mill, in the suburbs of Cap-de-la-Madeleine, Québec<br><br>production process:<br>0↑1000 °F<br>(followed from «blackish brown») |
| black (red tone) | | |
| red-black<br>↓<br>more accentuated red-black | 9955<br><br>9956 | mineral : pyrolusite[101]<br>rock : black (light brown tone), mat<br>powder : black (light brown tone), mat<br>origin : probably Nova Scotia<br><br>production process:<br>2 g of pyrolusite + 2 g of sodium carbonate:<br>0↑1300 °F + 1 h at 1300 °F<br><br>0↑1400 °F + 1 h at 1400 °F<br>(followed at «brownish black») |
| black (brown tone) | | |
| brown-black | 9957 | mineral : chromite[294]<br>rock : dark grey<br>powder : dark grey<br>origin : Black Lake, Eastern Townships, Québec<br><br>production process:<br>(followed from «brownish grey darker than "dark brownish grey"»)<br>rock irradiated with gamma rays at 360 Mrad<br>(followed at «black») |
| brown-black | 9958 | mineral : biotite gneiss<br>rock : blackish grey, golden vitreous brilliance<br>powder : dark grey<br>origin : geological province of Grenville, Québec<br><br>production process:<br>rock hermetically wrapped in bread dough / 1600 °F / 1 h[1249] |
| | | mineral : hypersthene<br>rock : black<br>powder : medium brownish grey<br>origin : Lac Saint-Jean, Québec<br><br>production process:<br>(followed from «black more intense than "black"»)<br>rock irradiated with gamma[228] rays at: |

| | | |
|---|---|---|
| brown-black<br>↓<br>brown-black a bit darker | 9959<br><br>9960 | 360 Mrad<br><br>482.984 Mrad |
| brown-black | 9961 | mineral : magnetite<br>rock : dark grey, with metallic brilliance<br>powder : dark grey<br>origin : Fosse du Labrador, Québec<br><br>production process:<br>(followed from «very dark brownish grey, almost black»)<br>rock irradiated with gamma rays at 424.7 Mrad<br>(followed at «black») |
| brown-black | 9962 | production process:<br>(followed from «grey slightly lighter than "dark grey"»)<br>powder irradiated with gamma rays at 424.7 Mrad |
| brown-black | 9963 | mineral : malachite<br>rock : ribboned variety of pronounced mint-green<br>powder : light and brilliant mint-green<br>origin : Katanga province, at 300 km of Lubumbachai, Zaïr, Africa<br><br>production process:<br>(followed from «blackish chocolate-brown»)<br>0↑900 °F<br>(followed at «black») |
| brown-black | 9964 | production process:<br>0↑850 °F (blackish chocolate-brown): .50 g + 5 ml ammonia / natural drying<br>(followed at «black») |
| brown-black | 9965 | mineral : pyrolusite[101]<br>rock : black (light brown tone), mat<br>powder : black (light brown tone), mat<br>origin : probably Nova Scotia<br>production process:<br>2 g of pyrolusite + 2 g of sodium carbonate / 1600 °F / 1 h (powerful emerald-green [brown tone]) / irradiated with gamma rays at 64.7 Mrad[1250]<br>(followed at «mixture of particles: light grey / blackish brown») |
| | | production process:<br>(followed from «reddish black more accentuated than "reddish black"») |

| | | |
|---|---|---|
| brown-black | 9966 | 2 g of pyrolusite + 2 g of sodium carbonate / 0↑1500 °F + 1 h at 1500 °F (followed at «very powerful and dark emerald-green») |
| | | mineral : tourmaline<br>rock : very dark grey, almost black<br>powder : very dark grey, almost black<br>origin : Villeneuve Mine, Papineau county, Québec |
| brown-black | 9967 | production process:<br>(followed from «black»)<br>rock irradiated with gamma rays at 484.704 Mrad[228,433] |
| | | mineral : coal<br>rock : black<br>powder : brownish black<br>origin : bank of Saint-Lawrence river, city of Québec, Québec |
| brown-black a bit more brown than «brown-black» | 9968 | production process:<br>2 g of coal + 25 ml hydrochloric acid / soaking: 24 h / drying on hot plate[251] |
| | | mineral : pyrolusite[101]<br>rock : black (light brown tone), mat<br>powder : black (light brown tone), mat<br>origin : probably Nova Scotia |
| brown-black a bit more brown than «brown-black» | 9969 | production process:<br>2000 °F / 20 min. |
| ↓<br>brown-black still a bit more brown | 9970 | 1000 °C / 12 h |
| brown-black a bit more brown and profound than «brown-black» | 9971 | production process:<br>4 g of pyrolusite + 20 ml hydrofluoric acid / soaking: 24 h / drying in drying oven at 100 °F |
| | | mineral : tourmaline<br>rock : very dark grey, almost black<br>powder : very dark grey, almost black<br>origin : Villeneuve Mine, Papineau county, Québec |

1875

| | | |
|---|---|---|
| brown-black more intense and profound than «brown-black» | 9972 | production process:<br>(followed from «greyish black»)<br>powder irradiated with gamma rays at 424.7 Mrad[239,1252] |
| black (light brown tone) a bit more profound than «brown-black» | 9973 | mineral : malachite<br>rock : ribboned variety of pronounced mint-green<br>powder : light and brilliant mint-green<br>origin : Katanga province, at 300 km of Lubumbachai, Zair, Africa<br><br>mineral : sulphur<br>rock : brilliant yellow<br>powder : brilliant yellow<br>origin : unknown<br>production process:<br>2 g of malachite + 2 g of sulphur / 1300 °F / 1 h (black) / irradiated with gamma rays at 424.7 Mrad[81,239] |
| black more brown and profound, more accentuated and luminous than «brown-black» | 9974 | mineral : malachite<br>rock : ribboned variety of pronounced mint-green<br>powder : light and brilliant mint-green<br>origin : Katanga province, at 300 km of Lubumbachai, Zair, Africa<br>production process:<br>2 g of malachite + 2 g of sodium carbonate / 700 °F / 1 h (black) / irradiated with gamma rays at 424.7 Mrad[81,239] |
| brown-black more profound than «brown-black» | 9975 | mineral : nickeliferous pyrrhotite[23]<br>rock : dark iron-grey, with silver and golden yellow metallic brilliance<br>powder : dark iron-grey<br>origin : Inco Co., Sudbury, Ontario<br>production process:<br>(followed from «black»)<br>0↑1900 °F (dark iron-grey): .50 g + 50 ml nitric acid / soaking: 2 wk. / drying on hot plate (blackish brown) / irradiated with gamma rays at 430.4 Mrad |
| | | mineral : fuel oil soot[86]<br>powder : profound brownish black<br>origin : boiler room of Laval University, city of Québec, Québec |

1876

| | | |
|---|---|---|
| brown-black more brown than «profound brown-black» | 9976 | production process:<br>2000 °F / 45 min. |
| brown-black more brown than «profound brown-black» | 9977 | mineral : fuel oil soot[86]<br>powder : profound brownish black<br>origin : boiler room of Laval University, city of Québec, Québec<br><br>mineral : nickel<br>powder : dark brownish grey, with metallic brilliance<br><br>production process:<br>1 g of soot + 1 g of nickel / 2000 °F / 45 min. |
| brown-black (violet tone) | | |
| brown-black (accentuated violet tone) | 9978 | mineral : pyrolusite[101]<br>rock : black (light brown tone), mat<br>powder : black (light brown tone), mat<br>origin : probably Nova Scotia<br><br>production process:<br>4 g of pyrolusite + 100 ml nitric acid / soaking: 2 years and 23 d. / drying on hot plate |
| brown-black (accentuated violet tone) | 9979 | production process:<br>3 g of pyrolusite + 40 ml nitric acid / drying on hot plate |
| brown-black (accentuated violet tone) | 9980 | production process:<br>1000 °C / 12 h (brownish black more brown than «brownish black»): 60 g + 200 ml phosphoric acid / immediately put to dry on hot plate / brought to boiling point during 2 d. (colour of the liquid: intense crimson-violet [almost opaque]) / separation of the liquid and the solid / drying on hot plate (colour of the liquid: lilac-old rose [still humid]) / colour of the solid [still humid] |
| smoky black | | |
| | | mineral : bornite<br>rock : reddish brown (with localized green and bluish green oxidation)<br>powder : reddish brown |

1877

| | | |
|---|---|---|
| smoky black | 9981 | origin : Lac Musset, Fosse du Labrador, Québec<br><br>production process:<br>(followed from «blackish brown»)<br>rock irradiated with gamma rays at 360 Mrad<br>(followed at «coal-grey») |
| smoky black | 9982 | mineral : diopside<br>rock : light grey<br>powder : light beige<br>origin : Mont Orford, Québec<br><br>production process:<br>1 g of diopside + 80 ml phosphoric acid / soaking: 2 wk. / drying on hot plate (still humid) / colour of the liquid[160] |
| soot-black | | |
| soot-black<br>↓<br>soot-black<br>↓<br>soot-black | 9983<br><br>9984<br><br>9985 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «dark greyish brown»)<br>1 g of goethite + 1 g of sodium carbonate + 3 g of sulphur / 1600 °F / 1 h<br><br>1 g of goethite + 2 g of sodium carbonate + 1 g of sulphur / 0↑1000 °F<br><br>1 g of goethite + 2 g of sodium carbonate + 1 g of sulphur / 0↑1100 °F<br>(followed at «soot-black [light green tone]») |
| | | mineral : goethite[106]<br>powder : rusty orange<br>origin : Red Mill, in the suburbs of Cap-de-la-Madeleine, Québec<br><br>mineral : feldspar<br>rock : white, opaque<br>powder : white<br>origin : Baraute, Abitibi, Québec<br><br>production process:<br>(followed from «soot-black [brown tone]» and |

| | | |
|---|---|---|
| profound soot-black | 9986 | «light rusty orange») 0↑1400 °F / slow cooling in furnace (indian red[107]): 1.50 g + 1.50 g of feldspar (dark reddish brown) / deposited in a porcelain crucible, closed with a cover / the entity is hermetically wrapped in bread dough / 1600 °F / 1 h |
| soot-black (green tone) | | |
| | | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br>production process:<br>(followed from «soot-black»)<br>1 g of goethite + 2 g of sodium carbonate + 1 g of sulphur: |
| soot-black (light green tone) | 9987 | 0↑1200 °F[1253] |
| ↓ | | |
| soot-black (light green tone) | 9988 | 0↑1300 °F[1254] |
| ↓ | | |
| soot-black (light green tone) | 9989 | 0↑1500 °F (followed at «blackish green») |
| soot-black (brown tone) | | |
| | | mineral : goethite[106]<br>powder : rusty orange<br>origin : Red Mill, in the suburbs of Cap-de-la-Madeleine, Québec<br><br>production process: |
| soot-black (brown tone) | 9990 | deposited in a porcelain crucible closed with a cover / the entity is hermetically wrapped in bread dough / 1600 °F / 1 h (followed at «profound soot-black») |
| black | | |
| | | mineral : tremolite<br>rock : olive-green (grey tone)<br>powder : greyish beige<br>origin : Tetreault Mine, Montauban, Portneuf county, Québec |

| | | |
|---|---|---|
| black | 9991 | <u>production process:</u><br>(followed from «dark olive-green [brown tone]»)<br>rock irradiated with gamma rays at 484.704 Mrad |
| black | 9992 | mineral : blue lace agate<br>rock : light blue (violet tone), slightly translucid<br>powder : very light grey<br>origin : Africa<br><br><u>production process:</u><br>1 g of agate + 1 g of sodium carbonate / 1600 °F / 1 h |
| black | 9993 | mineral : blue lace agate<br>rock : light blue (violet tone), slightly translucid<br>powder : very light grey<br>origin : Africa<br><br>mineral : sulphur<br>rock : brilliant yellow<br>powder : brilliant yellow<br>origin : unknown<br><br><u>production process:</u><br>1 g of agate + 2 g of sodium carbonate + 1 g of sulphur / 1600 °F / 1 h |
| black | 9994 | mineral : Gaspé agate<br>rock : marbled nodule of shaded tints of white, pink and light grey, slightly translucid<br>powder : very light pinkish grey<br>origin : Mont Lyall, Gaspésie, Québec<br><br><u>production process:</u><br>1 g of agate + 1 g of sodium carbonate / 1600 °F / 1 h |
| | | mineral : Gaspé agate<br>rock : marbled nodule of shaded tints of white, pink and light grey, slightly translucid<br>powder : very light pinkish grey<br>origin : Mont Lyall, Gaspésie, Québec<br><br>mineral : sulphur<br>rock : brilliant yellow<br>powder : brilliant yellow<br>origin : unknown |

1880

| | | |
|---|---|---|
| black | 9995 | production process:<br>1 g of agate + 2 g of sodium carbonate + 1 g of sulphur / 1600 °F / 1 h |
| black | 9996 | mineral : tiger-eye agate<br>rock : orange with silky luster, opaque<br>powder : orange with silky luster<br>origin : Africa<br><br>production process:<br>1 g of agate + 1 g of sodium carbonate / 1600 °F / 1 h |
| black | 9997 | mineral : tiger-eye agate<br>rock : orange with silky luster, opaque<br>powder : orange with silky luster<br>origin : Africa<br><br>mineral : sulphur<br>rock : brilliant yellow<br>powder : brilliant yellow<br>origin : unknown<br><br>production process:<br>1 g of agate + .50 g of sodium carbonate + .50 g of sulphur / 1600 °F / 1 h |
| black | 9998 | mineral : bloody agate<br>rock : dark grass-green, slightly translucid<br>powder : light grey (light green tone)<br>origin : India<br><br>production process:<br>1 g of agate + 1 g of sodium carbonate / 1600 °F / 1 h |
| black | 9999 | mineral : bloody agate<br>rock : dark grass-green, slightly translucid<br>powder : light grey (light green tone)<br>origin : India<br><br>mineral : sulphur<br>rock : brilliant yellow<br>powder : brilliant yellow<br>origin : unknown<br><br>production process:<br>1 g of agate + 2 g of sodium carbonate + 1 g of sulphur / 1600 °F / 1 h |
| | | mineral : asbestos[4] |

| | | |
|---|---|---|
| | | rock : dark grey (green reflection)<br>powder : light grey (green reflection)<br>origin : Asbestos Corporation Ltd., Thetford Mines, Québec<br><br>mineral : sulphur<br>rock : brilliant yellow<br>powder : brilliant yellow<br>origin : unknown<br><br>production process:<br>(followed from «medium rusty brown» and «dark rusty brown») |
| black | 10000 | 50 g of asbestos + 200 ml hydrochloric acid or asbestos entirely covered with hydrochloric acid / soaking: 1 wk. / drying on hot plate (vivid yellow): 1 g + 2 g of sodium carbonate + 1 g of sulphur / 1700 °F / 1 h |
| black | 10001 | 50 g of asbestos + 200 ml hydrochloric acid or asbestos entirely covered with hydrochloric acid / soaking: 1 wk. / drying on hot plate (vivid yellow): 1 g + 3 g of sodium carbonate + 1 g of sulphur / 1700 °F / 1 h<br>(followed at «medium reddish brown») |
| | | mineral : crocidolite<br>rock : dark greyish blue<br>powder : pale greyish blue<br>origin : Griqualand district, South Africa<br><br>mineral : sulphur<br>rock : brilliant yellow<br>powder : brilliant yellow<br>origin : unknown<br><br>production process:<br>(followed from «blackish brown») |
| black | 10002 | 1 g of crocidolite + 1 g of sodium carbonate + 1 g of sulphur / 1700 °F / 1 h |
| | | mineral : crocidolite<br>rock : dark greyish blue<br>powder : pale greyish blue<br>origin : Griqualand district, South Africa<br><br>production process: |
| black | 10003 | 4 g of crocidolite + 50 ml phosphoric acid / soaking: 4 wk. / drying on hot plate (still humid)[1255] |
| | | mineral : analcime<br>rock : white (grey reflection), crystalline |

| | | |
|---|---|---|
| | | and translucid<br>powder : light grey<br>origin : De-Mix quarry, North side of Mont Saint-Hilaire, Rouville county, Québec<br><br>production process:<br>1 g of analcime + 50 ml phosphoric acid / soaking: 2 wk. / drying on hot plate (still humid) / colour of the liquid[160] |
| black | 10004 | |
| | | mineral : andulusite<br>rock : light brownish grey<br>powder : light grey<br>origin : Bimbowrie, South Australia<br><br>production process:<br>4 g of andulusite + 80 ml phosphoric acid / soaking: 2 wk. / drying on hot plate (still humid) / colour of the liquid[7] |
| black | 10005 | |
| | | mineral : anorthosite<br>rock : dark grey<br>powder : medium grey<br>origin : Jonquière, Lac Saint-Jean, Québec<br><br>mineral : sulphur<br>rock : brilliant yellow<br>powder : brilliant yellow<br>origin : unknown<br><br>production process:<br>1 g of anorthosite + 2 g of sodium carbonate + 1 g of sulphur / 0↑1600 °F |
| black | 10006 | |
| | | mineral : antigorite<br>rock : pale yellowish green<br>powder : very pale greenish yellow<br>origin : Canadian Refractories Mine, Kilmar, Québec<br><br>mineral : sulphur<br>rock : brilliant yellow<br>powder : brilliant yellow<br>origin : unknown<br><br>production process:<br>(followed from «blackish chocolate-brown»)<br>1 g of antigorite + 1 g of sodium carbonate + 2 g of sulphur / 0↑1600 °F |
| black | 10007 | |
| | | mineral : apatite |

1883

| | | |
|---|---|---|
| black | 10008 | rock : medium brownish red<br>powder : light pinkish beige<br>origin : Ile Calumet, Pontiac county, Québec<br><br>production process:<br>(followed from «dark chocolate—brown»)<br>rock irradiated with gamma rays at 424.7 Mrad |
| black | 10009 | mineral : beryl<br>rock : very light yellowish green, slightly translucid<br>powder : white (green reflection)<br>origin : Lacorne district, Abitibi, Québec<br><br>mineral : sulphur<br>rock : brilliant yellow<br>powder : brilliant yellow<br>origin : unknown<br><br>production process:<br>1 g of beryl + 2 g of sodium carbonate + 1 g of sulphur / 1600 °F / 1 h[1256] |
| black | 10010 | mineral : fluorescent calcite<br>rock : white (localized grey or brown reflection), translucid<br>powder : light orange-beige<br>origin : Bancroft, Ontario<br>production process:<br>4 g of calcite + 20 ml nitric acid / soaking: 3 d. / separation of the liquid and the solid / drying on hot plate (colour of the solid: dark brownish grey) / irradiated with gamma rays at 424.7 Mrad[81] |
| black | 10011 | mineral : chalcocite<br>rock : dark iron-grey<br>powder : dark iron-grey<br>origin : Butte, Montana, United States<br>production process:<br>0↑1600 °F (dark iron-grey) / powder irradiated with gamma[239] rays at 64.7 Mrad<br>(followed at «black more profound than "black"») |
| black | 10012 | production process:<br>0↑1900 °F (dark iron-grey): .60 g + 50 ml nitric acid / soaking: 2 wk. / drying on hot plate (orange-red) / irradiated with gamma[239] rays at 424.7 Mrad |
| | | mineral : chromite[294]<br>rock : dark grey<br>powder : dark grey<br>origin : Black Lake, Eastern Townships, Québec |

1884

| | | |
|---|---|---|
| black | 10013 | <u>production process:</u><br>(followed from «brownish black»)<br>rock irradiated with gamma rays at 602.804 Mrad |
| black | 10014 | mineral : corundum<br>rock : medium grey<br>powder : light grey<br>origin : Transvaal, Africa<br><br><u>production process:</u><br>1 g of corundum + 50 ml phosphoric acid / soaking: 2 wk. / drying on hot plate (still humid) / colour of the liquid[160] |
| black | 10015 | mineral : copper<br>rock : reddish brown, with metallic luster<br>powder : reddish brown, with metallic luster<br>origin : unknown<br><br><u>production process:</u><br>(followed from «grey»)<br>100 g of copper + 100 ml hydrochloric acid / soaking: 5 months / drying on hot plate (fairly pronounced greenish turquoise) / 0↑1000 °F |
| black | 10016 | <u>production process:</u><br>100 g of copper + 100 ml hydrochloric acid / soaking: 5 months / drying on hot plate (fairly pronounced greenish turquoise) / 0↑1000 °F (black): .50 g + 5 ml ammonia / natural drying |
| black | 10017 | <u>production process:</u><br>(followed from «iron-grey»)<br>100 g of copper + 100 ml nitric acid / soaking: 5 months / natural drying (light bluish turquoise) / 0↑1000 °F |
| black<br>↓ | 10018 | <u>production process:</u><br>(followed from «iron-grey [almost black]»)<br>100 g of copper + 100 ml nitric acid / soaking: 5 months / natural drying (light bluish turquoise):<br><br>0↑800 °F (very dark iron-grey, almost black): .50 g + 5 ml ammonia / natural drying |
| black | 10019 | 0↑1000 °F (black): .50 g + 5 ml ammonia / natural |

1885

| | | |
|---|---|---|
| | | drying |
| black | 10020 | mineral : solid epidote<br>rock : brownish green<br>powder : brownish green<br>origin : James Bay, Québec<br><br>production process:<br>rock hermetically wrapped in bread dough / 1600 °F / 1 h |
| black<br>↓ | 10021 | mineral : galena<br>rock : dark grey, with metallic brilliance<br>powder : dark grey, with metallic brilliance<br>origin : Trail, British Columbia<br><br>production process:<br>(followed from «brownish green» [stainless steel])<br>4 g of galena powder are deposited on a piece of copper measuring 1" x 1" / 1400 °F / 20 min. / slow cooling in furnace[280] |
| black | 10022 | 4 g of galena powder are deposited on a piece of black plate measuring 1" x 1" / 1400 °F / 20 min. / slow cooling in furnace[280]<br>(followed at «grey» [aluminium] and «brown» [brass - galvanized sheet]) |
| black | 10023 | mineral : galena<br>rock : dark grey, with metallic brilliance<br>powder : dark grey, with metallic brilliance<br>origin : Trail, British Columbia<br><br>mineral : sulphur<br>rock : brilliant yellow<br>powder : brilliant yellow<br>origin : unknown<br><br>production process:<br>(followed from «grey»)<br>10 g of galena powder + 10 g of sulphur / grinded and distributed in 8 porcelain covers used for porcelain crucibles / 0↑1400 °F[280]<br>(followed at «dark caramel-brown») |
| black | 10024 | mineral : biotite gneiss<br>rock : blackish grey, golden vitreous brilliance<br>powder : dark grey<br>origin : geological province of Grenville, Québec<br>production process:<br>12 g of gneiss + 40 ml phosphoric acid / soaking: |

| | | |
|---|---|---|
| | | 2 wk. / drying on hot plate (still humid) / colour of the solid[9] |
| black [with «pink iridescent» spots] | 10025 | mineral : goethite[106]<br>powder : rusty orange<br>origin : Red Mill, in the suburbs of Cap-de-la-Madeleine, Québec<br><br>mineral : sulphur<br>rock : brilliant yellow<br>powder : brilliant yellow<br>origin : unknown<br><br><u>production process:</u><br>1 g of goethite + 2 g of sodium carbonate / 0↑1700 °F / cooling: 1 g + 1 g of sulphur / 0↑1700 °F[1257] |
| black | 10026 | <u>production process:</u><br>1 g of goethite + 2 g of sodium carbonate + 1 g of sulphur / 1600 °F / 1 h (blackish green) / irradiated with gamma rays at 65.65 Mrad[1250] (followed at «dark milky chocolate-brown») |
| black | 10027 | mineral : graphite<br>rock : dark grey, with metallic brilliance<br>powder : dark grey, with metallic brilliance<br>origin : Grenville, Québec<br><br><u>production process:</u><br>4 g of graphite + 100 ml sulphuric acid / soaking: 3 months / drying on hot plate |
| black | 10028 | mineral : halite[41]<br>rock : colourless<br>powder : colourless<br>origin : Seleine Mine, Iles-de-la-Madeleine, Québec<br><br><u>production process:</u><br>(followed from «blackish brown»)<br>rock irradiated with electrons at 164,800 rad (light grey [light blue tone]), then at 155,082 rad (light lemon-yellow), then with gamma rays at:<br>148.4 Mrad[1258] |
| black ↓ | 10029 | 201.6 Mrad |
| black ↓ | 10030 | 247.6 Mrad |
| black ↓ | 10031 | 287.3 Mrad |
| black ↓ | 10032 | 360 Mrad |

| | | |
|---|---|---|
| black | 10033 | production process:<br>(followed from «grey darker than "dark grey"»)<br>rock irradiated with neutrons at<br>$10^{12}$ neutrons / $cm^2$ / sec. during:<br>20,000 seconds |
| black | 10034 | 30,000 seconds[1259] |
| black ↓ | 10035 | 40,000 seconds |
| black | 10036 | production process:<br>rock irradiated with gamma rays at 28.5 Mrad<br>(brownish grey darker than «medium brownish grey»)<br>then with neutrons at $10^{12}$ neutrons / $cm^2$ / sec.<br>during 40,000 seconds[1260]<br>(followed at «black more profound than "black"») |
| black | 10037 | production process:<br>(followed from «very dark brown, almost black»)<br>rock irradiated with gamma rays at 604.53 Mrad |
| black | 10038 | production process:<br>rock irradiated with neutrons at $10^{12}$ neutrons / $cm^2$ / sec. during 30,000 seconds (black), then with gamma rays at 102.4 Mrad[133] |
| black | 10039 | mineral : hornblende<br>rock : medium evergreen (light grey tone), with a vitreous brilliance<br>powder : medium cold grey (light green tone)<br>origin : Seleine Mine, Iles-de-la-Madeleine, Québec<br><br>mineral : sulphur<br>rock : brilliant yellow<br>powder : brilliant yellow<br>origin : unknown<br><br>production process:<br>1 g of hornblende + 1 g of sulphur / 1600 °F / 1 h |
| black | 10040 | mineral : hypersthene<br>rock : black<br>powder : medium brownish grey<br>origin : Lac Saint-Jean, Québec<br><br>production process:<br>1 g of hypersthene + 2.50 g of sodium carbonate / 1600 °F / 1 h |
| | | mineral : kaolin |

1988

| | | |
|---|---|---|
| black | 10041 | rock : chalk-white (yellow reflection)<br>powder : chalk-white (yellow reflection)<br>origin : Saint-Rémi d'Amherst, Québec<br><br>production process:<br>3 g of kaolin + 80 ml phosphoric acid / soaking: 2 wk. / drying on hot plate (still humid) / colour of the liquid[7] |
| black | 10042 | mineral : magnetite<br>rock : dark grey, with metallic brilliance<br>powder : dark grey<br>origin : Fosse du Labrador, Québec<br><br>production process:<br>(followed from «orange-brown a bit lighter than "orange-brown"»)<br>0↑1900 °F (dark chocolate-brown): 1 g + 50 ml hydrochloric acid / soaking: 2 wk. / drying on hot plate (orange-brown) / irradiated with gamma rays at 430.4 Mrad |
| black | 10043 | production process:<br>(followed from «brownish black»)<br>rock irradiated with gamma[228] rays at 482.984 Mrad |
| black | 10044 | mineral : malachite<br>rock : ribboned variety of pronounced mint-green<br>powder : light and brilliant mint-green<br>origin : Katanga province, at 300 km of Lubumbachai, Zair, Africa<br><br>production process:<br>(followed from «brownish black»)<br>0↑1000 °F |
| black<br>↓ | 10045 | production process:<br>(followed from «brownish black»)<br>0↑900 °F (brownish black): .50 g + 5 ml ammonia / natural drying |
| black | 10046 | 0↑1000 °F (black): .50 g + 5 ml ammonia / natural drying |
| black<br>↓ | 10047 | production process:<br>2 g of malachite + 2 g of sodium carbonate:<br>500 °F / 1 h |
| black | 10048 | 700 °F / 1 h |

1889

| | | |
|---|---|---|
| | | mineral : malachite<br>rock : ribboned variety of pronounced mint-green<br>powder : light and brilliant mint-green<br>origin : Katanga province, at 300 km from Lubumbachai, Zaïr, Africa<br><br>mineral : sulphur<br>rock : brilliant yellow<br>powder : brilliant yellow<br>origin : unknown<br><br>production process:<br>2 g of malachite + 2 g of sulphur: |
| black | 10049 | 700 °F / 1 h<br><br>(followed at «brown»)<br><br>(followed from «brown») |
| ↓ | | |
| black | 10050 | 1300 °F / 1 h<br>(followed at «dark grey») |
| | | mineral : microcline<br>rock : white (grey reflection)<br>powder : white (grey reflection)<br>origin : Buckingham, Québec<br><br>production process: |
| black | 10051 | 4 g of microcline + 80 ml phosphoric acid / soaking: 2 wk. / drying on hot plate (still humid) / colour of the liquid[78] |
| | | mineral : amazon stone<br>rock : light greenish turquoise, translucid<br>powder : white (turquoise reflection)<br>origin : unknown<br><br>mineral : sulphur<br>rock : brilliant yellow<br>powder : brilliant yellow<br>origin : unknown<br><br>production process: |
| black | 10052 | 1 g of amazon + 2 g of sodium carbonate + 1 g of sulphur / 1600 °F / 1 h |
| | | mineral : amazon stone<br>rock : light greenish turquoise, translucid<br>powder : white (turquoise reflection)<br>origin : unknown |

| | | |
|---|---|---|
| black | 10053 | <u>production process:</u><br>1 g of amazon + 1 g of sodium carbonate / 1600 °F / 1 h |
| black | 10054 | mineral : molybdenite[48] (flakes of $MoS_2$ + pegmatite [quartz + bismuth])<br>rock : transparent and grey<br>powder : medium cold grey<br>origin : Lamotte, Abitibi, Québec<br><br><u>production process:</u><br>6 g of molybdenite + 80 ml phosphoric acid / soaking: 2 wk. / drying on hot plate (still humid) / colour of the liquid[7] |
| black | 10055 | mineral : molybdenite[103]<br>rock : medium grey, with metallic brilliance<br>powder : medium grey, with metallic brilliance<br>origin : Anglo American Molybdenite Mine, near Lamotte, Preissiac district, Abitibi, Québec<br><br><u>production process:</u><br>2 g of molybdenite + 20 ml phosphoric acid / soaking: 3 d. / drying on hot plate (still humid) / colour of the liquid[154] |
| black | 10056 | mineral : peridotite<br>rock : medium grey<br>powder : medium brownish grey (green reflection)<br>origin : Thetford Mines, Québec<br><br><u>production process:</u><br>0↑1900 °F (orange-brown): .20 g + 50 ml phosphoric acid / soaking: 2 wk. / drying on hot plate (still humid) / colour of the liquid[160] |
| black | 10057 | <u>production process:</u><br>4 g of peridotite + 80 ml phosphoric acid / soaking: 2 wk. / drying on hot plate (still humid) / colour of the liquid[160] |
| | | mineral : peridotite<br>rock : medium grey<br>powder : medium brownish grey (green reflection)<br>origin : Thetford Mines, Québec<br><br>mineral : sulphur<br>rock : brilliant yellow<br>powder : brilliant yellow |

| | | |
|---|---|---|
| black | 10058 | origin : unknown<br><br>production process:<br>1 g of peridotite + 1 g of sodium carbonate + 1 g of sulphur / 1700 °F / 1 h |
| black | 10059 | mineral : pyrrhotite<br>rock : dark greyish brown, with golden yellow metallic brilliance<br>powder : dark grey<br>origin : Inco Co., Sudbury, Ontario<br><br>mineral : calcite[11]<br>powder : white<br>origin : Calcite du Nord Company, Saint-Eugène de Mistassini, Lac Saint-Jean, Québec<br><br>production process:<br>1 g of pyrrhotite + 1 g of calcite / 1000 °C / 1 h |
| black | 10060 | mineral : nickeliferous pyrrhotite[23]<br>rock : dark iron-grey, with silver and golden yellow metallic brilliance<br>powder : dark iron-grey<br>origin : Inco Co., Sudbury, Ontario<br><br>production process:<br>0↑1900 °F (dark iron-grey): .50 g + 50 ml nitric acid / soaking: 2 wk. / drying on hot plate (blackish brown) / irradiated with gamma rays at 70.4 Mrad<br>(followed at «brownish black more profound than "brownish black"») |
| black | 10061 | mineral : crystalline quartz<br>rock : colourless<br>origin : Ferme Adam, Bonsecours, Eastern Townships, Québec<br><br>production process:<br>1 g of quartz + 1 g of sodium carbonate / 1600 °F / 1 h |
| | | mineral : crystalline quartz<br>rock : colourless<br>origin : Ferme Adam, Bonsecours, Eastern Townships, Québec<br><br>mineral : sulphur<br>rock : brilliant yellow<br>powder : brilliant yellow<br>origin : unknown |

| | | |
|---|---|---|
| black | 10062 | <u>production process:</u><br>1 g of quartz + 2 g of sodium carbonate + 1 g of sulphur / 1600 °F / 1 h |
| black | 10063 | mineral : quartz - mica[96]<br>powder : light cream (light yellow tone)<br>origin : small copper and nickel deposit, in the South-Western area of a mass of serpentinite at 3 km at the West of Saint-Fabien-de-Panet, Québec<br><br><u>production process:</u><br>4 g of quartz - mica + 100 ml hydrochloric acid / soaking: 1 wk. / drying on hot plate[1250] |
| black | 10064 | mineral : rutile<br>powder : dark brown (orange-red reflection)<br>origin : North Stradbroke Island, Queensland, Australia<br><br><u>production process:</u><br>.40 g of rutile + 80 ml phosphoric acid / soaking: 2 wk. / drying on hot plate (still humid) / colour of the liquid[160] |
| black | 10065 | mineral : serandite<br>rock : orange-pink or salmon (with more orange areas)<br>powder : pinkish white<br>origin : De-Mix quarry, North side of Mont Saint-Hilaire, Rouville county, Québec<br><br><u>production process:</u><br>1000 °C / 1 h |
| black | 10066 | mineral : serandite<br>rock : orange-pink or salmon (with more orange areas)<br>powder : pinkish white<br>origin : De-Mix quarry, North side of Mont Saint-Hilaire, Rouville county, Québec<br><br>mineral : sulphur<br>rock : brilliant yellow<br>powder : brilliant yellow<br>origin : unknown<br><br><u>production process:</u><br>1 g of serandite + 2 g of sodium carbonate + 1 g of sulphur / 1600 °F / 1 h |

| | | |
|---|---|---|
| black | 10067 | mineral : siderite<br>rock : caramel-brown (grey tone)<br>powder : light orange-beige<br>origin : De-Mix quarry, North side of Mont Saint-Hilaire, Rouville county, Québec<br><br>production process:<br>1000 °C / 1 h (blackish grey) / powder irradiated with gamma[509] rays at 122.984 Mrad (followed at «blackish brown») |
| black | 10068 | mineral : siderite<br>rock : caramel-brown (grey tone)<br>powder : light orange-beige<br>origin : De-Mix quarry, North side of Mont Saint-Hilaire, Rouville county, Québec<br><br>mineral : calcite[11]<br>powder : white<br>origin : Calcite du Nord Company, Saint-Eugène de Mistassini, Lac Saint-Jean, Québec<br><br>production process:<br>1 g of siderite + 1 g of calcite / 1000 °C / 1 h |
| black | 10069 | mineral : smaltite[25], variety of skutterudite<br>rock : dark iron-grey, with silver metallic brilliance<br>powder : dark grey<br>origin : Cobalt, Ontario<br><br>production process:<br>1 g of smaltite + 1 g of sodium carbonate / 1400 °F / 1 h<br>(followed at «medium iron-grey») |
| black | 10070 | mineral : spodumene<br>rock : pale green<br>powder : light grey, almost white<br>origin : Québec Lithium Co., Baraute, Abitibi, Québec<br><br>production process:<br>2 g of spodumene + 50 ml phosphoric acid / soaking: 2 wk. / drying on hot plate (still humid) / colour of the liquid[160] |
| black | 10071 | production process:<br>0↑1900 °F (medium brownish grey): .30 g + 80 ml |

1894

| | | |
|---|---|---|
| | | phosphoric acid / soaking: 2 wk. / drying on hot plate (still humid) / colour of the liquid[7] |
| black | 10072 | mineral : steatite<br>rock : light evergreen<br>powder : white<br>origin : East Broughton, Québec<br><br><u>production process:</u><br>0↑2200 °F (light brown): 2 g + 50 ml phosphoric acid / soaking: 2 wk. / drying on hot plate (still humid) / colour of the liquid[160] |
| black | 10073 | mineral : fuel oil soot[86]<br>powder : profound brownish black<br>origin : boiler room of Laval University, city of Québec, Québec<br><br><u>production process:</u><br>20 g of soot + 100 ml phosphoric acid / soaking: 3 wk. / separation of the liquid and the solid / drying on hot plate (still humid) / colour of the solid[59] |
| black | 10074 | mineral : tourmaline<br>rock : very dark grey, almost black<br>powder : very dark grey, almost black<br>origin : Villeneuve Mine, Papineau county, Québec<br><br><u>production process:</u><br>rock irradiated with gamma rays at 124.704 Mrad (followed at «brownish black») |
| black | 10075 | <u>production process:</u><br>2 g of tourmaline + 25 ml hydrochloric acid / soaking: 3 d. / drying on hot plate |
| black | 10076 | <u>production process:</u><br>2 g of tourmaline + 25 ml sulphuric acid / soaking: 3 d. / drying on hot plate |
| | | mineral : tourmaline<br>rock : very dark grey, almost black<br>powder : very dark grey, almost black<br>origin : Villeneuve Mine, Papineau county, Québec<br><br>mineral : nickel |

1895

| | | |
|---|---|---|
| black | 10077 | powder : dark brownish grey, with metallic brilliance<br><br>production process:<br>1 g of tourmaline + 1 g of nickel / 2000 °F / 20 min. |
| black | 10078 | mineral : tremolite<br>rock : medium brown (evergreen tone)<br>powder : greyish beige<br>origin : Tetreault Mine, Montauban, Portneuf county, Québec<br><br>production process:<br>6 g of tremolite + 50 ml phosphoric acid / soaking: 2 wk. / drying on hot plate (still humid) / colour of the liquid[160] |
| black | 10079 | mineral : vesuvianite<br>rock : lilac<br>powder : lilac<br>origin : John Mansville Mine, Asbestos, Québec<br><br>mineral : sulphur<br>rock : brilliant yellow<br>powder : brilliant yellow<br>origin : unknown<br><br>production process:<br>1 g of vesuvianite + 2 g of sodium carbonate + 1 g of sulphur / 1700 °F / 1 h |
| black | 10080 | mineral : zincite<br>rock : mixture of areas: dark grey / orange-red<br>powder : medium milky chocolate-brown (red tone)<br>origin : Franklin, New Jersey, United States<br><br>production process:<br>0↑1900 °F |
| black | 10081 | production process:<br>4 g of zincite + 50 ml nitric acid / soaking: 2 wk. / drying on hot plate (blackish brown) / irradiated with gamma[239] rays at 424.7 Mrad[81] |
| | | mineral : hypersthene<br>rock : black<br>powder : medium brownish grey<br>origin : Lac Saint-Jean, Québec |

| | | |
|---|---|---|
| black a bit more intense than «black» | 10082 | production process:<br>rock irradiated with gamma[228] rays at:<br>5 Mrad |
| ↓ black still a bit more intense | 10083 | 10 Mrad |
| ↓ black still a bit more intense | 10084 | 57.4 Mrad |
| ↓ black still a bit more intense | 10085 | 63.984 Mrad |
| ↓ black still a bit more intense | 10086 | 102.4 Mrad |
| ↓ black still a bit more intense | 10087 | 122.984 Mrad |
| ↓ black still a bit more intense | 10088 | 148.4 Mrad |
| ↓ black still a bit more intense | 10089 | 201.6 Mrad |
| ↓ black still a bit more intense | 10090 | 247.6 Mrad |
| ↓ black equivalent to the previous one | 10091 | 287.3 Mrad<br>(followed at «brownish black») |
| black a bit more profound than «black» | 10092 | mineral : fuel oil soot[86]<br>powder : profound brownish black<br>origin : boiler room of Laval University, city of Québec, Québec<br><br>production process:<br>irradiated with gamma[239] rays at 424.7 Mrad[81] |
| black more profound than «black» | 10093 | mineral : chalcocite<br>rock : dark iron-grey<br>powder : dark iron-grey<br>origin : Butte, Montana, United States<br><br>production process:<br>(followed from «black»)<br>0↑1600 °F (dark iron-grey) / powder irradiated with gamma[239] rays at 424.7 Mrad |

1897

| | | |
|---|---|---|
| black more profound than «black» | 10094 | mineral : halite[41]<br>rock : colourless<br>powder : colourless<br>origin : Seleine Mine, Iles-de-la-Madeleine, Québec<br><br>production process:<br>(followed from «black»)<br>rock irradiated with gamma rays at 555.02 Mrad (very dark brown, almost black), then with neutrons at $10^{12}$ neutrons / $cm^2$ / sec. during 40,000 seconds[1263] |
| black more profound than «black»<br>↓ | 10095 | mineral : pyrolusite[101]<br>rock : black (light brown tone), mat<br>powder : black (light brown tone), mat<br>origin : probably Nova Scotia<br><br>production process:<br>powder irradiated with gamma[239] rays at:<br>64.7 Mrad |
| black still more black | 10096 | 424.7 Mrad |
| black more profound than «black»<br>↓ | 10097 | mineral : zincite<br>rock : mixture of areas: dark grey / orange-red<br>powder : medium milky chocolate-brown (red tone)<br>origin : Franklin, New Jersey, United States<br><br>production process:<br>0↑1900 °F (black) / powder irradiated with gamma[239] at:<br>64.7 Mrad |
| black still more profound and intense | 10098 | 424.7 Mrad |
| profound black | 10099 | mineral : fuel oil soot[86]<br>powder : profound brownish black<br>origin : boiler room of Laval University, city of Québec, Québec<br><br>mineral : chrome<br>powder : light grey, with metallic brilliance<br>production process:<br>1 g of soot + 1 g of chrome / 2000 °F / 45 min. |

| | | |
|---|---|---|
| black more profound than «profound black» | 10100 | mineral : fuel oil soot[86]<br>powder : profound brownish black<br>origin : boiler room of Laval University, city of Québec, Québec<br>production process:<br>the soot is deposited in the furnace / 0↑1300 °F / we connect the $COCO_2$ tube to the furnace (with a pressure of approximately 500) / maintenance at 1300 °F during 2 h with exposition to the gas / slow cooling in furnace / removal at approximately[1264] 200 °F |
| black more profound than «profound black» | 10101 | production process:<br>the soot is deposited in the furnace / 0↑1900 °F / we connect the $COCO_2$ tube to the furnace (with a pressure of approximately 500) / maintenance at 1300 °F during 2 h with exposition to the gas / slow cooling in furnace / removal at approximately[1265] 200 °F |
| black more profound than «profound black» | 10102 | production process:<br>the soot is deposited in the furnace / we connect the $COCO_2$ tube to the furnace / 0↑1300 °F / sweeping with a neutral gas (oxygen: 10.1%; balance: argon) or with air before removal / immediately removed[1266] |
| black more profound than «profound black» | 10103 | mineral : zincite<br>rock : mixture of areas: dark grey / orange-red<br>powder : medium milky chocolate-brown (red tone)<br>origin : Franklin, New Jersey, United States<br>production process:<br>the soot is deposited in the furnace / we connect the $COCO_2$ tube to the furnace / 0↑1300 °F + 1 h at 1300 °F with exposition to the gas / cooling in the furnace in the presence of the gas / sweeping with neutral gas (oxygen: 10.1%; balance: argon) or with air before removal[1267] |
| mixture of particles | | |
| black / white / red | 10104 | mineral : copper<br>rock : reddish brown, with metallic luster<br>powder : reddish brown, with metallic luster<br>origin : unknown<br>production process:<br>(followed from «brownish grey»)<br>rock entirely covered with 1000 ml acetic acid / natural drying / removal of the crystals formed at the surface of the rock (the colour of the crystals: pronounced emerald-green) / 0↑1300 °F |

NOTES

1. The solid is «white» with a few «very light green-orange» cristals. For the colour of the liquid, see «greenish turquoise».

2. The solid is essentially composed of white crystals; only a few of them are «light orange-yellow», which gives it a general appearance of «light lemon-yellow».

3. The solid is composed of three layers of colurs: «orange-brown» at the surface; «white», in the middle; «chocolate-brown» at the bottom. For the colour of the liquid, see «very light brown».

4. The semi-quantitative spectrographic analysis of the asbestos from Asbestos may be read as follows. Dosage %: Si 15-25 / Mg 15-25 / Fe 2-8 / Al .05-.5 / Ca .05-.5 / K .05-.5 / Cu .1-1 / Ni .1-1 / Co .01-.1 / Mn .01-.1 / Ti .005-.05 / Zn .005-.05. The asbestos bears the serial number N-784-7RS / MEAS 16 x 16 x T2.

5. At 254.204 Mrad, the «white» is identical to the one obtained at 63.984 Mrad.

6. For the colour of the liquid, see «black».

7. For the colour of the solid, see «grey».

8. «White» with a few «brown» particles.

9. For the colour of the liquid, see «brown».

10. For the colour of the liquid, see «blue» and «black».

11. The analysis of the calcite may be read as follows. Dosage %: 2.75 $SiO_2$ / .31 $Al_2O_3$ / .1 Fe / 53. CaO / 1. MgO / .14 $Na_2O$ / .15 $K_2O$ / 41.15 $CO_2$ / .02 S / 41.4 Loss with fire.

12. «White» with «pale azure-blue» particles.

13. For the colour of the liquid, see «grey».

14. After two years of soaking, the solid is «azure-blue». For the colour of the liquid, see «turquoise».

15. «White» with «brown-grey» particles at the surface.

16. The solid is composed of three layers of colours: «white» at the surface; «grey» in the middle; «brown-grey (green tone)» at the bottom.

17. The matter obtained has the texture of coarse sugar.

18. For the colour of the liquid, see «greenish black».

19. The finest particles are «white»; the medium, «fairly dark grey-

1900 beige»; the biggest, «light pink».

20. The semi-quantitative spectrographic analysis of this pigment may be read as follows. Dosage %: 10-50% Si / 5-20% Fe / 2-10% Mg,K / 1/2-2% Al / 0,1-1% Cr,Mn,Ni,As / 0,05-0,5% Na,P,Ca / 0,01-0,1% Ti,Zn / 0,005-0,05% Co,Zr,Sb / 0,001-0,01% Cu,Pb. Another semi-quantitative spectrographic analysis of the same pigment may be read as follows. Dosage %: 54,2 $SiO_2$ / 5,50 $Al_2O_3$ / 9,53 MgO / 0,25 CaO / 0,32 $Na_2O$ / 0,56 $K_2O$ / 0,25 $TiO_2$ / 0,49 MnO / 22,5 Fe t. in $Fe_2O_3$ / 0,05 C total 550 Zn.

21. The «white» colour of the sodium carbonate becomes considerably more pure when it is irradiated by itself with electrons at 302,831 rad[36]. Before irradiation, the powder appears to have a «grey reflection», which disappears afterwards.

22. For the colour of the liquid, see «greenish grey».

23. The semi-quantitative spectrographic analysis of the nickeliferous pyrrhotite may be read as follows. Dosage %ELMT: .038 MgK / .254 AlK / .673 SiK / 36.206 S K / .169 CaK / 58.737 FeK / .037 NaK / .088 K K / 3.798 NiK.

24. The matter is composed of translucent crystals.

25. The semi-quantitative spectrographic analysis of smaltite may be read as follows. Dosage %ELMT: .026 SiK / .298 S K / 81.925 AsL / 2.023 CaK / 9.016 FeK / .018 ZnK / 6.691 CoK for a total of 99.998.

26. After two years of soaking, the solid is «dark reddish brown» or «dark brownish red». For the colour of the liquid, see «violet-pink».

27. The semi-quantitative spectrographic analysis of the sphalerite from Matagami may be read as follows. Dosage %ELMT: .678 SiK / 39.972 S K / 2.093 AsL / .287 CaK / 20.263 FeK / 36.609 ZnK / .095 CoK for a total of 99.996.

28. «White» covered with a thin layer of «bluish green» powder.

29. For the colour of the solid, see «creamy yellow».

30. The liquid is transparent.

31. The semi-quantitative spectrographic analysis of the sphalerite from Gaspésie may be read as follows. Dosage %ELMT: 38.546 S K / 61.455 ZnK for a total of 100.001.

32. «White» with a «light beige reflection» in some areas.

33. The «white» is whiter than the one obtained with the liquid. Immediately after the bubbling, the liquid is a «very powerful emerald-green». However, this colour disappears when it is dried on the hot plate. It may be possibly retained if it were dried naturally or on a sand bath or by dessication.

1901

34. «White» with «pink» particles.

35. The solution is composed of 15 g of tartric acid, 100 ml of distilled water and 10 ml of hydrochloric acid.

36. 162,431 rad + 140,400 rad = 302,831 rad. At 162,431 rad, there is no perceptible change to the naked eye.

37. For the colour of the liquid, see «amber».

38. For the colour of the solid, see «chocolate-brown».

38a. Irradiated with gamma rays at 64.7 Mrad and 424.7 Mrad, there is no perceptible change to the naked eye.

39. The rock is covered with a thin «red-orange» layer after heating.

40. The rock has «reddish orange» streaks on its circumference.

41. The semi-quantitative spectrographic analysis of halite may be read as follows. Dosage %: 16.81 Na-K / 0.00 Si-K / 82.92 Cl-K / 0.22 Ca-K.

42. When quartz (with white kaolinite impurities) is wrapped in bread dough and heated, it becomes whiter than when heated at the same temperature without being wrapped in bread dough.

43. Semi-opaque «white» with areas having a «beige reflection».

44. Opaque «white» with areas of the circumference having an «orange reflection».

45. 162,431 rad + 140,400 rad = 302,831 rad.

46. 164,800 rad + 140,400 rad = 305,200 rad. At 164,800 rad, there is no perceptible change to the naked eye.

47. The change is more evident when the dolomite is rock rather than powder. The white dolomite powder, irradiated with neutrons during 2,000 seconds at $10^{12}$ neutrons / $cm^2$ / second undergoes no perceptible change to the naked eye. The dolomite powder, irradiated with neutrons and afterwards soaked in the D19 Kodak photographic developer, undergoes no perceptible change to the naked eye.

48. The semi-quantitative spectrographic analysis of the molybdenite may be read as follows. The transparent area is pure Si. The grey area: %ELMT: SiK 12.00 / S K 9.91 / CuK 3.09 / BiM 74.98.

49. This pigment, obtained after heating and soaking in sulphuric acid, undergoes no perceptible change to the naked eye, when it is irradiated with electrons at 162,431 rad.

50. The colour becomes more white and pale.

51. This note is cancelled.

52. For the colour of the liquid, see «blue».

53. In the present document, the minerals were generally heated and cooled before irradiation. However, some were heated and irradiated while hot. In both cases, we obtain different results. Therefore, we may obtain a variety of colours or tones of a same colour by modifying the temperature and the irradiation dosage; likewise, if we cool off the mineral to low temperatures instead of heating it before irradiation or, still, if we irradiate it in a controlled atmosphere (ex.: in the presence of gas).

54. For the colour of the liquid, see «greenish turquoise».

55. For the colour of the liquid, see «emerald-green».

56. All the minerals which were heated and afterwards applied in one or many acid(s), were previously cooled off. However, they could have been applied in acid, while hot in order to obtain variations of colours.

57. With «greenish turquoise» particles.

58. This note is cancelled.

59. For the colour of the liquid, see «green».

60. With «grey» particles at the surface.

61. The blue lace agate, irradiated at the state of a rock, with electrons at 305,200 rad, undergoes no perceptible change to the naked eye.

62. The following natural minerals, heated with sulphur, either underwent but a very slight change or no change at all to the naked eye. In the colour system these minerals bear the following serial nos.: 14, 19, 28, 34, 96, 267, 272, 367, 537, 546, 563, 581, 607, 621, 936, 1564, 2042, 2207, 2240, 4738. The conditions were the same for all of the minerals: one part of mineral for one part of sulphur, grinded and heated successively at 300 °F, 400 °F, 500 °F, 600 °F, 700 °F, 800 °F, 900 °F, 1000 °F, 1100 °F, 1200 °F, 1300 °F, 1400 °F, 1500 °F, 1600 °F and 1700 °F during one hour each, except for 1800 °F and 1900 °F at 30 minutes. When grinded together, the components are either dry or humidified with water.

63. When irradiated with gamma rays at 63.984 Mrad, there is no perceptible change to the naked eye.

64. For the colour of the solid, see «beige».

65. Irradiated with neutrons during 2,000 seconds at $10^{12}$ neutrons / $cm^2$ / second, the apophyllite powder undergoes no perceptible change to the naked eye, when it is afterwards soaked in the D19 Kodak photographic developer.

66. Gypsum powder, irradiated with neutrons during 2,000 seconds at $10^{12}$ neutrons / $cm^2$ / second, undergoes no perceptible change to the naked eye nor when soaked afterwards in the Kodak D19 developer.

67. Irradiated with electrons at 305,200 rad, it undergoes no perceptible change to the naked eye.

68. Irradiated with neutrons during 2,000 seconds at $10^{12}$ neutrons / $cm^2$ / second, kaolin powder undergoes no perceptible change to the naked eye nor when soaked afterwards in the Kodak D19 developer.

69. When the dosage augments, the colour becomes very slightly more accentuated at each step.

70. Immediately after the bubbling, the liquid is a «very powerful emerald-green». However, when dried on hot plate, the colour disappears. It would probably be retained if the drying was natural or on a sand bath or by desiccation.

71. It conserves almost the same translucence though it becomes slightly milky.

72. With «brown-grey» particles.

73. 164,800 rad + 140,400 rad = 305,200 rad.

74. The piece of polyester resin, which is originally almost transparent, with an «ivory reflection», modifies itself when irradiated. With gamma rays at 11.4 Mrad, the reflection becomes «pale yellow ochre» and the resin remains almost transparent. With electrons at 155,082 rad, the reflection becomes a «very, very light beige»; at 305,082 rad[73], the reflection becomes a «more accentuated ivory» than before irradiation. In the last two cases, the resin maintains the same transparence, though the colour changes. 139 natural and transformed minerals underwent no perceptible change to the naked eye, when applied in the resin and, afterwards, irradiated with X rays with a Philips therapeutic apparatus used for medical purposes, during 4 h at 448 «shots» at each interval of 30 seconds during 1/10 of a second at 100 milliamper and 70 kV at a distance of 40 inches.

75. For the colour of the liquid, see «yellowish green».

76. When the mineral is put in the acid, the liquid becomes «green»; one day later, «mint-green» and, the solid, «green». Then the two become «white». When deposited on a hot plate, the solution becomes «intense green»; but, when brought to the boiling point in order to dry, it becomes «white». Another method of drying other than by heat may allow to maintain the «green» colour.

77. For the colour of the solid, see «brown-grey».

78. For the colour of the solid, see «light grey».

1904

79. For the colour of the liquid, see «yellow».

80. The rock is slightly translucent.

81. At 64.7 Mrad, there is no perceptible change to the naked eye.

82. The analysis by X ray diffraction, with a Cu 6352 spectrum, identifies the major phase of this mineral as being calcite and quartz and, the minor phase, dolomite. The semi-quantitative spectrographic analysis may be read as follows. Dosage %: 10-50 Ca / 2-10 Si / 1-5 Mg,Al / 0,1-1 Fe,Sr / 0,05-0,5 Na,P,Ti / 0,01-0,1 Mn,Zn / 0,005-0,05 Zr / 0,001-0,01 B,V,Cr < 0,001 Ni,Cu,Pb. Another semi-quantitative spectrographic analysis of the same mineral may be read as follows: Dosage %: 16,3 $SiO_2$ / 3,40 $Al_2O_3$ / 2,42 MgO / 39,7 CaO / 0,31 $Na_2O$ / 0,80 $K_2O$ / 0,21 $TiO_2$ / 0,03 MnO / 1,43 Fe T. in $Fe_2O_3$ / 9,20 C total / PPM 560 Zn.

83. Crystalline.

84. The «green» appearance is more intense.

85. With «dark iron-grey» particles.

86. The analysis by X ray diffraction, with a Cu 6360 spectrum, of the fuel oil soot may be read as follows: almost amorphous materials. Non identifiable phases: crystalline, because in too small quantity. The semi-quantitative spectrographic analysis reveals that the dosage in % is: 5-20 V / 1-5 Fe / 0,1-1 Mg,P,Ca,Ni / 0,05-0,5 Na,Si,Mn / 0,01-0,1 Al,Zn / 0,005-0,05 Ti,Cr,Cu,Sr / 0,001-0,01 B,Co,Zn,Pb / < 0,001 Bi. Another semi-quantitative spectrographic analysis reveals that the dosage in % is: 1,22 $SiO_2$ / 0,70 $Al_2O_3$ / 0,93 MgO / 2,36 CaO / 1,59 $Na_2O$ / 0,18 $K_2O$ / < 0,10 $TiO_2$ / 0,09 MnO / 11,2 Fe t. in $Fe_2O_3$ / 30,5 C total / 530 PPM Zn.

87. Yofortierite, a new hydrated manganese silicate is chemically composed of: $SiO_2$ 48.44 / MnO 28.41 / MgO 2.35 / $Al_2O_3$ 1.49 / ZnO 1.10 / CaO 0.90 / $TiO_2$ 0.09 / $K_2O$ 0.05 / $Cr_2O_3$ 0.007 / $H_2O$ 17.22 / total 100.057.

88. 1 cc of white transparent printing ink, produced by the Sinclair and Valentine Company, is mechanically grinded and applied (13 superimpositions) on a white glazed paper and, then, irradiated with gamma rays at 22.8 Mrad. The ink, a slightly milky clear varnish, becomes «light yellowish cream». 1 cc of white transparent printing ink of the Encre d'imprimerie du Canada Company is mechanically grinded and applied (13 superimpositions) on a glazed white paper. The transparent varnish has a «light yellowish cream» tint. Irradiated with gamma rays at 5.7 Mrad, the varnish underwent no perceptible change to the naked eye; at 11.4 Mrad, it becomes slightly lighter and remains as such at 17.91 Mrad and at 22.8 Mrad. 1 cc of white opaque ink of the Encre d'imprimerie du Canada Company, mechanically grinded and applied (6 superimpositions) on glazed white paper, becomes «very light creamy beige». This varnish, irradiated with gamma rays, underwent no perceptible change to the naked eye at 5.7 Mrad; it is slightly more light at 11.4 Mrad and remains identical at 17.91 and 22.8 Mrad. All of these ink samples did not undergo any perceptible change to the naked eye, when they were irradiated with X rays with a Philips therapeutic apparatus usually used for medical purposes, during 4 h of irradiation with 448 «shots» at intervals of 30 seconds during 1/10 second at 100 milliamper and 70 kV at a distance of 40 inches. Likewise, these varnishes undergo no perceptible change to the naked eye when irradiated with electrons at 155,082 rad.

89. At 5.7 Mrad, there is no perceptible change to the naked eye.

89a. At 17.91 Mrad and 22.8 Mrad, the colour is identical to the one obtained at 11.4 Mrad 90. At 5.7 and 11.4 Mrad, there is no perceptible change to the naked eye.

91. The semi-quantitative spectographic analysis of the silica may be read as follows: 92.15 $SiO_2$ / .5 $Al_2O_3$ / .66 Fe / .01 CaO / .07 MgO / .01 $Na_2O$ / .04 $K_2O$ / .02 $CO_2$ / .03 S / .01 loss at fire.

92. The X rays analysis by diffraction, having a Cu 8365 spectrum, identifies the major phase of the bauxite as being gibbsite and the possible but uncertain phases as boehmite and haematite. A semi-quantitative spectrographic analysis margin reveals the following results %: 10-50 Si / 5-20 Fe / 2-10 Mg,K / 1/2-2 Al / 0,1-1 Cr,Mn,Ni,As / 0,05-0,5 Na,P,Ca / 0,01-0,1 Ti,Zn / 0,005-0,05 Co,Zr,Sb / 0,001-0,01 Cu,Pb. The semi-quantitative spectrographic analysis may be read as follows %: 5.56 $SiO_2$ / 55.3 $Al_2O_3$ / 0.02 MgO / 0.08 CaO / 0.24 $Na_2O$ / 0.03 $K_2O$ / 3.40 $TiO_2$ / 0.01 MnO / 5.30 Fe t. in $Fe_2O_3$ / 0.79 C total / PPM 120 Zn.

93. After five months of soaking, we obtain a «pure white». In its final drying phase on the hot plate, it becomes «light cream».

93a. At 11.4, 17.91 and 22.8 Mrad, the «cream» colour is identical to the one obtained at 5.7 Mrad.

93b. At 22.8 Mrad, the «cream» colour is identical to the one obtained at 17.91 Mrad.

94. When the synthetic white enamel paint, used for the car's body, is irradiated with gamma rays at 5 Mrad, the «white» becomes a «light yellow reflection»; at 57.4 Mrad, a «pinkish yellow reflection»; at 102.4 Mrad, an «orange reflection»; at 360 Mrad, an «orange-yellow reflection». The white transparent synthetic enamel paint, used for the car's body, when covered with a clear varnish, takes on a very light amber tone. When it is irradiated at 102.4 Mrad, the varnish becomes a translucent «orange-caramel» and the change is considerable. At 360 Mrad, the varnish becomes a translucent «orange-brown». The same two samples undergo no perceptible change to the naked eye, when irradiated with electrons at 155,082 rad and with X rays with a Philips therapeutic apparatus usually used for medical purposes during 4 h for a total of 448 «shots» at each interval of 30 seconds during 1/10 of a second at 100 milliamper and 70 kV at a distance of 40 inches.

95. With «olive-green» particles.

96. A X ray diffraction analysis with a Cu 6354 spectrum identifies the major phases as being quartz and mica. A semi-quantitative spectrographic analysis margin may be read as follows %: 10-50 Si / 2-10 Al,K / 1-5 Mg,Fe / 0,1-1 Ni / 0,05-0,5 Na,P,Ti,Cr,Ba / 0,01-0,1 Zn,Zr / 0,005-0,05 Ca,Mn,Cu,Pb / 0,001-0,01 B,V,Co,Sn,Sb / <0,001 Be,Mo. The semi-quantitative spectrographic analysis may be read as follows %: 56.3 $SiO_2$ / 19.5 $Al_2O_3$ / 2.84 MgO / 0.08 CaO / 0.18 $Na_2O$ / 7.60 $K_2O$ / 0.69 $TiO_2$ / 0.01 MnO / 5.82 Fe t. in $Fe_2O_3$ / 0.10 C total / PPM 580 Zn.

97. Slightly more pale than the original pigment.

97a. The «cream» colour, obtained at 11.4 Mrad, is identical to the one obtained at 5.7 Mrad; the colour obtained at 22.8 Mrad, to the one obtained at 17.91 Mrad.

97b. The «cream» colour, obtained at 22.8 Mrad, is identical to the one obtained at 17.91 Mrad.

98. The margin of a semi-quantitative spectrographic analysis of this pigment may be read as follows %: 5-15 Si / 5-20 Fe / 2-10 Mg / 2-10 Al / .5-3 K / .5-3 Mn / .2-1 Ni / .1-1 Cu / .02-.2 Co / .02-.2 Ti / .005-.05 Az / .01-.1 As / .01-.1 P,Rb,Sr,Zr / Zn PPM 540.

99. A few particles with an «orange tone» vivifies the colour.

100. After two years of soaking, the liquid and the solid are «light yellow».

101. The semi-quantitative spectrographic analysis of the pyrolusite may be read as follows %Elmt: 98.32 MnK / 1.59 BrL for a total of 100.00.

102. The semi-quantitative spectrographic analysis of pentlandite may be read as follows %Elmt: 2.388 MgK / 14.643 AlK / 43.088 SiK / 4.654 S K / 23.648 K K / 1.080 CaK / 9.954 FeK / .538 ZnK / for a total of 99.994.

103. The semi-quantitative spectrographic analysis of a first sample of molybdenite may be read as follows: %Elmt: 41.853 S K / 58.137 MoL for a total of 99.991; a second sample: %Elmt: 40.608 S K / 59.382 MoL for a total of 99.991.

104. When 6 cc of polymer used for concrete is added to 2 g of white cement, 0.18 cc of catalyst, 1.50 thousandth of a g of 6% cobalt, grinded manually and placed in a mould, hardened and irradiated with gamma rays at 18.85 Mrad, the piece, which is originally «light beige», becomes «medium and more accentuated beige». On the other hand, when 6 cc of polymer used for concrete is added to 0.18 cc of catalyst, 1.50 thousandth of a g of 6% cobalt, manually grinded, placed in a mould, hardened and irradiated with gamma rays at 18.85 Mrad, the piece, transparent at the origin, becomes a translucent «orange-caramel».

105. Immediate bubbling when deposited. «Mint-green» liquid at the surface. «Yellow» matter at the bottom. After drying, the liquid becomes «light cream». For the 2nd liquid and the residual solid, see «beige».

106. The X ray analysis by diffraction shows that the major phase of this pigment is goethite. The margin of a semi-quantitative spectrographic analysis may be read as follows %: 10-50 Fe / 0,1-1 Ca / 0,05-0,5 Si,P,Mn,Zn / 0,005-0,05 Na,Ti / 0,001-0,01 B,Mg,Al,Zr,W / <0,001 Cr,Ni,Cu,Pb. The semi-quantitative spectrographic analysis of this goethite may be read as follows: 1.13 $SiO_2$ / 0.30 $Al_2O_3$ / 0.05 MgO / 0.89 CaO / 0.09 $Na_2O$ / 0.08 $K_2O$ / <0.10 $TiO_2$ / 0.09 MnO / 6.88 Fe t. in $Fe_2O_3$ / 7.35 C total / PPM 880 Zn.

107. Once the goethite was heated 0†1400 °F, then slowly cooled in the furnace (15 h), the margin of a semi-quantitative spectrographic analysis of the same goethite, appearing at note 106, may be read as follows %: 40-70 Fe / .1-1 Ca / .1-1 Mg / .1-1 Al / .1-1 Si / .01-.1 Cu / .01-.1 Mn / .01-.1 P / .005-.05 Zn / .005-.05 Ti / .002-.02 As.

108. In this colour system, there are many examples of minerals which were applied to either the synthetic white transparent or white opaque enamel paint used for the car's body, or to the transparent polyester resin, and which changed in colour when irradiated. Consequently, we may conclude that it is possible to transform the colour of an «object,which is already entirely fabricated»,with irradiation. For example, let us consider the case of the caps of the 20 ml bottles of Packard Instrument Canada Ltd., number C 100326. When irradiated with gamma rays at 0.1 Mrad, they become a «more or less intense blue»; at 3.77 Mrad, «medium lilac»; at 7.54 Mrad, «more pronounced lilac» or «light violet»; at 11.31 Mrad, «violet slightly more accentuated»; at 15.08 Mrad, «violet still more accentuated»; at 18.85 Mrad, «violet slightly more accentuated»; «beige, ranging from light to dark and more intense» and then «brown» at 20, 40.2, 65.704 and 129.688 Mrad; then, at 360 Mrad, «dark and very accentuated yellow ochre». We conclude that:

1) it is possible to produce a range of colours or qualities of a same colour by irradiating at various dosages an object which is already fabricated;
2) the mineral, which was previously irradiated, could afterwards be applied in the polyester resin and irradiated again;
3) irradiation could occur at different moments of the application of the mineral in the resin (for example, before the catalyst is deposited in it);
4) layers of polyester resin, in which different types of minerals have successively been put, could be superimposed and irradiated afterwards in their entirety, which would result in a piece of resin having many layers of different colours;

5) this same technique may be applied to pigments other than minerals;
6) objects, which have already been fabricated with pigments other than minerals could therefore be coloured by irradiation and the colour could be renewed by new irradiations; thus, the notion of colouring would be revolutionized. «Colouring» would mean «irradiating»; «to colour anew», to «charge anew the colour» or to irradiate it again.

The same type of bottle caps, as mentioned above, were irradiated with X rays with a Philips therapeutic apparatus usually used for medical purposes, during 4 h with a total of 448 «shots», that is to say with one «shot» at each 30 seconds and during 1/10 of a second at 100 milliamper and 70 kV, at a distance of 40 inches from the samples. There is no perceptible change to the naked eye. Irradiated with electrons at 155,082 rad, the «white» of the cap is slightly modified, but insufficiently to identify the colour which is starting to appear.

109. The «lilac» obtained is less vivid and slightly darker than the one obtained with the same fluorine heated at 1000 °C during one hour and irradiated at the same dosage.

110. The fine-grained particles are «dark grey-beige»; the biggest, «lilac». Soaked in the Kodak D19 developer, the particles undergo no perceptible change to the naked eye.

111. The X rays analysis by diffraction with a Cu 8355 spectrum, may be read as follows. Major phase: haematite / minor phase: magnetite / in traces: quartz. One semi-quantitative spectrographic analysis indicates: 2-10% Fe / 1/2-2% Si / 0,1-1% Ca / 0,05-0,5% Al,P,Mn / 0,01-0,1% Mg,Zn / 0,005-0,05% Na,Ti / 0,001-0,01% Cr,Zr,Sb / < 0,001% Co,Ni,Cu,Pb. Another semi-quantitative spectrographic analysis reveals more precise dosages: %: 5,92 $SiO_2$ / 1,80 $Al_2O_3$ / 0,17 MgO / 0,92 CaO / 0,21 $Na_2O$ / 0,20 $K_2O$ / 0,13 $TiO_2$ / 0,10 MnO / 42,8 Fe t. en $Fe_2O_3$ / 22,1 C total/ PPM Zn 590.

112. After two years of soaking, the liquid is «very light cold green»; the matter, «lilac-pink», is covered with a layer of «very light green» powder. After drying, a white crust covers the pigment.

113. For the colour of the solid, see «dark grey or brown». The powder, which results from the drying of the liquid, has «pale beige (pink-orange tone)» spots. All the minerals, soaked in an acid during 4 years, were contained in glass bottles well closed with a plastic cap for the first two years; during one year, with a perforated paraffin sheet and, during the last year, they were left uncovered.

114. The smallest particles are «yellow»; the biggest, «lilac».

1909

115. The mineral loses the «pink tone» and becomes more «violet». The colour is vivid. Erythrite (752), mixed with fuel oil soot and heated at 450 °F during 10 min, becomes «mauve-blue» (912.2); with shale[547] [formation of Sillery] (4057), «mauve-blue» (912.3); with zinc (319), «mauve-blue» (912.4), though less blue than with animal soot; with brown ochre[111] (717), «mauve-blue» (912.5); with orpiment (3287), «mauve-blue» (912.1). All the «mauve-blue» obtained have different tones. The brown ochre comes from a deposit of various proportions of ferric oxides and silica at the Belmont cemetery in Sainte-Foy in the suburbs of Québec. When heated 0↑1300 °F and slowly cooled in the furnace, this brown ochre becomes «burnt Sienna».

116. The range of colours, produced with goethite, was done as follows. I deposited a quantity of mineral in the furnace at 0 °F. At each 100 °F, I removed a sample of this quantity of mineral. The sample was removed as soon as the temperature was reached. Other conditions could have been applied to build a range of colours with this mineral. A sample could have been removed at each 50 °F or, still, 75 °F or other temperature. The important aspect is to maintain the «same proceedure» in order to obtain the uniformity of the results. Another method would have been to put a sample in the furnace, which was already heated at a precise temperature, and to remove it only after a certain time (ex.: 1 h or 2 h). Furthermore, the mineral could have been humidified with water or another liquid before, during or after the heating, in order to obtain a more vivid colour. The mineral may be stirred regularly while heating, which ameliorates the quality of the colour and may even modify it. Generally, a heating, which is too prolonged, dries or burns the mineral. The same conclusions may be applied to the minerals heated in ambient air and in a controlled atmosphere.

117. The goethite is the first layer at the surface of the deposit of Red Mill. When the mineral is heated and it becomes «violet», «blue» traces appear. In all likelihood, this pigment [or the neighbouring pigments in this deposit] may be used to produce a «blue».

118. The surface of the enamel may be divided in two colours: one is «violet» and, the other, «brown». Irradiated with electrons at 155,082 rad, the sample does not undergo any perceptible change to the naked eye.

119. Translucent.

120. At this dosage, the rock becomes more opaque, but remains partially translucent.

121. This fluorine, applied in the synthetic white transparent enamel paint and, afterwards, irradiated with electrons at 155,082 rad, does not undergo any perceptible change to the naked eye.

1910

122. Maintains the same translucence.

123. When irradiated with gamma rays at 18.85 Mrad, the cement does not seem to be damaged; at least, this is not perceptible to the naked eye. The cement remains very solid after the irradiation. It evens needs to be broken in a bronze mortar in order to recuperate the rocks it contains. Does this allow to conclude that the irradiation hardens the cement?

124. The yellow fluorine, integrated to the cement during its preparation, and irradiated afterwards, become of a «more intense violet» and it becomes opaque more rapidly than when the rock is irradiated independently from the cement.

125. The white cement, mixed with water, manually grinded and moulded, hardened and dried, is a «chalk-white» piece; heated 0↑1900 °F, it becomes «very light beige-grey» and it is easily friable. Irradiated with gamma rays at 18.85 Mrad, the «very light beige-grey» undergoes no change perceptible to the naked eye. The grey cement, prepared in the same manner, heated 0↑1900 °F, and then irradiated with gamma rays at 18.85 Mrad, undergoes no change perceptible to the naked eye.

126. The rock is totally opaque. The «violet» varies from the one obtained, when the rock is irradiated at its natural state, without being previously heated.

127. The yellow fluorine, applied in synthetic enamel paint used for the car and then irradiated with electrons at 155,082 rad, undergoes no change perceptible to the naked eye.

128. The semi-quantitative spectrographic analysis of this black mineral from Red Mill may be read as follows: Elmt %: 94.472 FeK / 4.285 SiK / 1.245 CaK for a total of 100.001.

128a. The rock becomes slightly more brown at 102.4 Mrad.

128b. «Blackish violet» cristals are formed in certain areas of the rock, after having received 122.984 Mrad, which is a sign that the matter has changed under the action of the irradiation and not only the colour.

129. The rock's translucence did not undergo any change.

130. The natural colour becomes more intense and darkens.

131. Irradiated with gamma rays at 64.7 Mrad and electrons at 305,200 rad[73], the sample did not undergo any change perceptible to the naked eye.

132. The rock is almost totally opaque.

133. The rock is opaque.

134. The rocks are almost totally opaque. The yellow fluorine, when irradiated in the cement, becomes «intense violet» at a much weaker dosage and it intensifies itself more rapidly than when the rocks are irradiated independently from the cement.

135. The few particles, which remain in the liquid which is not completely dried up, seem to be «dark brown».

136. The rock is opaque. The «violet is more blue» than the «reddish violet» obtained when the yellow fluorine receives 148.4 Mrad.

137. At this point, the rock becomes semi-opaque.

138. The rock is entirely opaque.

139. The colour is a «crimson-violet» type; the rock is opaque.

140. The rock is totally opaque.

141. See «dark violet».

141a. The «ultramarine-blue» corresponds to the colour number 506.3 B, dark ultramarine, of the Talens - Rembrandt pastels.

142. The violet fluorine, applied to the white transparent synthetic enamel paint used for the car's body and irradiated afterwards with electrons at 155,082 rad, undergoes no change perceptible to the naked eye.

143. The solid, after a drying attempt, became a humid paste composed of three colours: white, violet and crimson.

144. The «violet is more blue» than the one of the colourless fluorine irradiated only at 148.4 Mrad, which is of a more «reddish violet».

145. The same result is obtained with potassium carbonate by heating it 0 °F until it reaches a precise temperature, without however prolonging the heating for one hour, which is the case here.

146. The yellow fluorine becomes of a more «bluish red-violet» than when it is irradiated at 148.4 Mrad. At this last dosage, it is of a «more reddish violet».

147. The colour is a tint.

148. Approximately 1,200 minerals, natural and transformed, did not undergo any change perceptible to the naked eye, when they were irradiated with X rays with a Philips therapeutic apparatus usually used for medical purposes, during 4 h with 448 «shots», one «shot» being emitted at each 30 seconds during 1/10 of a second at 100 milliamper and 70 kV, at a distance of 40 inches from the samples.

149. For the colour of the rock, see «grey». The calcination of this

«blackish blue» would give, very likely, a variety of violet-blue and violet. When the pigment was completely dried up, I kept it on the hot plate. It then progressively took on a «violet» tint. It follows that the variety of blue, obtained with the acids, would give different ranges of violet-blue and blackish blue, if they are calcinated at different temperatures.

150. The particles are «dark violet-blue» with other particles, which are «dark grey».

151. An industrial pigment, the «true cerulean blue» of the Sennelier company of Paris, is irradiated with gamma rays at 63.984 Mard, without undergoing any perceptible change to the naked eye; at 122.984 Mrad, the blue is slightly more intense; at 482.984 Mrad, it is slightly more accentuated and a bit darker. This change is a slight amelioration of the colour. Irradiated with electrons at 164,800 rad, the «blue» does not undergo any change to the naked eye. At 305,200 rad[73], it becomes lighter and more vivid. The semi-quantitative spectrographic analysis of the original pigment is read as follows. %Elmt: .255 P K / 63.189 AlK / .486 CaK / 5.114 TiK / 12.721 CrK / 18.233 CoK to give a total of 99.999.

152. Until now, the rock has remained translucent.

153. For the colour of the solid, see «light mint-green [blue tone]».

154. For the colour of the solid, see «dark grey».

155. The colour is intense. After two years of soaking, the liquid and the solid are «emerald-green». The two were not separated before the drying. The «verdigris» layer of powder at the surface seems to be the colour of the liquid. Natural drying or on sand bath would likely give other results.

156. For the colour of the solid, see «mint-green».

157. a) The reactions obtained, during the heating of the sodium carbonate with the minerals, are equivalent with those obtained with potassium carbonate. b) All the variables, mentioned for the heating of the minerals, may be applied, when we use either sodium or potassium carbonate. c) The proportions of the components may vary to obtain variations of colour. d) Two or many minerals may be combined to be heated with the carbonate.

158. The rock is still translucent, but it is more opaque than the rock in its natural state. It may be divided in two parts: one is «blue»; the other, «light grass-green». The «blue» differs from the «peacock-blue» obtained at 164,800 rad.

159. The rock becomes slightly more opaque.

160. For the colour of the solid, see «white».

1913

161. The crystals are «blue» and there is a «greenish turquoise» powder. For the 1st liquid, see «emerald-green»; the solid, at «intense green [between "grass-green" and "Paris-green"]».

162. «Profound blue» with «greenish blue» and «green» areas.

163. This «very intense blue» nears the «royal-blue».

164. This «blue» becomes considerably more intense when irradiated with gamma rays. Irradiated with electrons at 162,431 rad, it does not undergo any change to the naked eye. When the two samples of this «blue», applied to the synthetic white opaque enamel paint used for the car's body, are exposed to solar rays during one year, they become of an «extremely intense and dark blue».

165. There are many methods that may be used to transform the colour of a mineral with one or many acid(s). Here are a few of them. First, a same quantity of mineral may be combined with various proportions of a same acid. Secondly, one acid may be combined with another reagent, for a same quantity of mineral. Thirdly, two acids or more may be combined to treat a same quantity of mineral. Let us see a few possible combinations:

BINARY COMBINATIONS

| A | B | A | B | A | B | Etc. |
|---|---|---|---|---|---|---|
| 5 ml + | 20 ml | 25 ml + | 25 ml | 25 ml + | 20 ml | |
| 10 ml + | 15 ml | 20 ml + | 20 ml | 20 ml + | 15 ml | |
| 15 ml + | 10 ml | 15 ml + | 15 ml | 15 ml + | 10 ml | |
| 20 ml + | 5 ml | 10 ml + | 10 ml | 10 ml + | 5 ml | |
| | | 5 ml + | 5 ml | | | |

TERNARY COMBINATIONS

| A | B | C | A | B | C | A | B | C |
|---|---|---|---|---|---|---|---|---|
| 5 ml + | 5 ml + | 20 ml | 5 ml + | 20 ml + | 20 ml | 5 ml + | 20 ml + | 5 ml |
| 10 ml + | 10 ml + | 15 ml | 10 ml + | 15 ml + | 15 ml | 10 ml + | 15 ml + | 10 ml |
| 15 ml + | 15 ml + | 10 ml | 15 ml + | 10 ml + | 10 ml | 15 ml + | 10 ml + | 15 ml |
| 20 ml + | 20 ml + | 5 ml | 20 ml + | 5 ml + | 5 ml | 20 ml + | 5 ml + | 20 ml |

| A | B | C | A | B | C | Etc. |
|---|---|---|---|---|---|---|
| 20 ml + | 5 ml + | 20 ml | 25 ml + | 25 ml + | 25 ml | |
| 15 ml + | 10 ml + | 15 ml | 15 ml + | 15 ml + | 15 ml | |
| 10 ml + | 15 ml + | 10 ml | 10 ml + | 10 ml + | 10 ml | |
| 5 ml + | 20 ml + | 5 ml | 5 ml + | 5 ml + | 5 ml | |

1914

QUATERNARY COMBINATIONS

| A | B | C | D | A | B | C | D |
|---|---|---|---|---|---|---|---|
| 5 ml + | 5 ml + | 5 ml + | 20 ml | 5 ml + | 5 ml + | 20 ml + | 20 ml |
| 10 ml + | 10 ml + | 10 ml + | 15 ml | 10 ml + | 10 ml + | 15 ml + | 15 ml |
| 15 ml + | 15 ml + | 15 ml + | 10 ml | 15 ml + | 15 ml + | 10 ml + | 10 ml |
| 20 ml + | 20 ml + | 20 ml + | 5 ml | 20 ml + | 20 ml + | 5 ml + | 5 ml |

| A | B | C | D | A | B | C | D Etc. |
|---|---|---|---|---|---|---|---|
| 5 ml + | 20 ml + | 5 ml + | 20 ml | 5 ml + | 20 ml + | 20 ml + | 20 ml |
| 10 ml + | 15 ml + | 10 ml + | 15 ml | 10 ml + | 15 ml + | 15 ml + | 15 ml |
| 15 ml + | 10 ml + | 15 ml + | 10 ml | 15 ml + | 10 ml + | 10 ml + | 10 ml |
| 20 ml + | 5 ml + | 20 ml + | 5 ml | 20 ml + | 5 ml + | 5 ml + | 5 ml |

The proportions of the mineral and the acid(s) may vary, as well as the duration of the soaking and the conditions of the drying. The various combinations, joined to the various conditions, will likely give different «blues», «greenish blues» and «greens». These observations may be applied to molybdenite as well as to all minerals treated with acid, such as bornite amongst others. Fourthly, the ranges of colours produced with the combination of a mineral (previously heated or not) and an acid or many acids may be, furthermore, treated with ammonia according to the various forms presented above. In the fifth place, the coloured pigments obtained may be, afterwards, calcinated at various temperatures in ambient air or in a controlled atmosphere. These tests open up to an infinity of possibilities. In the sixth place, when the mineral is heated either before or after the treatment with acid, or both in ambient air or in a controlled atmosphere, it may be exposed to heat from 0 °F to a determined temperature, then removed as soon as the temperature is reached or after having maintained it during a precise time at the same temperature (ex.: 1 h, 2 h, etc.). The mineral may also be put in the furnace as soon as the desired temperature is reached and may be maintained at the same temperature for a certain duration.

166. The variations, brought to the «grey» of the molybdenite (on this matter, see «grey») by using various methods, will certainly cause variations of the quality of the «blues» obtained afterwards with various treatments.

167. For the colour of the 1st liquid, see «greenish blue»; of the 3rd liquid, «greenish turquoise»; of the solid, «pale greyish green [orange tone]».

168. This pigment is essentially «dark blue» with a «dark grey» area. In fact, from 1400 °F going up, each test is done using the same proportions of the two components and we obtain coarse «blue» particles with a «grey» matter.

169. The rock is opaque. The fluorine, irradiated with gamma rays at

360 Mrad, becomes «intense peacock-blue» which nears «royal-blue».

170. The rock of sodalite, irradiated with electrons at 162,431 rad or 164,800 rad, does not undergo any change perceptible to the naked eye.

171. The liquid and the solid are not separated before the drying. The few «cobalt-blue» particles correspond to the liquid and, the «very light grey» matter, to the solid. Irradiated, the «grey» becomes «beige» and the, «cobalt-blue», «dark blue».

172. Ranges of «blues» or «greens», obtained with the molybdenite, may be obtained by exposing them to various dosages of irradiation going from the 0 point to the infinite, while keeping the same approach of the ranges formed by heat treatment[116].

173. The rocks are «very dark indigo-blue» and totally opaque.

173a. The «blue» corresponds to the «cobalt-blue», no. 512 of the pastels' chart of the Talens-Rembrandt Company, which is joined to this document.

174. The azurite did not undergo any change perceptible to the naked eye, when it was irradiated with gamma rays at 63.984 Mrad and with electrons at 162,431 rad.

175. The crystals are more luminous at this point. We find an «apple-green» oxidation at the surface.

176. The «cobalt-blue» of the rocks is more intense than when the rock is irradiated at the same dosage without being integrated to the cement.

177. The reaction is immediate. If we add ammonia to chrysocolla, the «blue» goes darkening and even transforms itself into a «blue which nears the violet».

178. The rocks are partially transluc ent.

179. The «black» crust in appearance becomes «very light beige» and the «royal-blue» deposit becomes «lapis lazuli-blue». The modification of the «royal-blue» colour of the glaze on the porcelain is the proof that irradiation can change the colour of the glaze, which may be interesting for ceramics, amongst others. Irradiated with electrons at 162,431 rad and at 302,831 rad[45], the «royal-blue» is not modified.

180. See the reference colour at «apple-green», which has not been irradiated before the heat treatment.

181. The colour slightly intensifies itself at 30 minutes, although it whitens when the rock is heated without being isolated from ambient air.

1916

182. After 14 days of soaking, the liquid is «crimson». It becomes «blue», while it is heated on the hot plate.

183. For the colour of the solid, see «apple-green».

184. The crystals are «azure-blue», with a powder whose colour is between the two indicated greens. It is the colour of the matter, which has been deposited at the bottom of the liquid at the beginning of the natural drying process. The liquid, as such, has transformed itself into «emerald-blue» cristals and, the solid, «mossy green».

185. The «azure-blue» therefore intensifies itself.

186. For the colour of the solid, see «lime-green». This pigment is kept in a dark brown tinted glass bottle. Consequently, the intensity of the colour has been maintained throughout the years. Other pigments, enclosed in transparent glass containers, have deteriorated. Furthermore and according to my experience, the pigments which easily absorb water must be kept in containers (for example, glass containers), hermetically closed with thick rubber stoppers.

187. For the colour of the solid, see «phtalo-green».

188. The colour is slightly more accentuated than the «azure-blue», obtained with the combination (2 g of wilsonite + 1 g of potassium carbonate), heated 0↑1500 °F.

189. Therefore, the «azure-blue» is intensified.

190. The colour intensifies itself without darkening or becoming more black.

191. For the colour of the solid, see «pale green».

192. The rock is divided in two areas: one is «royal-blue»; the other, «accentuated apple-green». It is translucent. The «blue» is different from the «peacock-blue), obtained by irradiation with electrons.

193. Translucent. The sylvite, irradiated firstly with electrons and secondly with neutrons during 2,000 seconds, has the same «royal-blue» colour, even though it is less intense.

194. The rock slowly becomes more opaque. It has two areas, as the case of the rock irradiated during 300 seconds. One is «blue»; the other, «more intense apple-green».

195. The rock, which becomes more opaque, has two small areas: one is «blue» and, the other, «grass-green».

196. The rock, which becomes more opaque, has two areas: one is «blue» and, the other, «more intense grass-green».

197. Small areas of the rock are «grass-green still more intense».

198. The rock has small «apple-green» spots at its center. The «royal-blue» colour, obtained after its irradiation with neutrons only, during a same duration, is much more intense. The intensity of this blue nears that of the blue obtained after irradiation with neutrons during 600 seconds.

199. One month after the irradiation with neutrons, I have measured the radioactivity of the sylvite, the green fluorine and the cristalline quartz, when they were bunched up according to the duration of the irradiation they received. A geiger counter, model S/W 489-33, was used. Placed at a distance of about 10 cm from the samples, the button of the counter was placed at 1. The dial indicated 0, passing through 0.1, 0.2, 0.3, etc., until it reached 1. The final total of all the samples was calculated at 0.4. At 300 seconds, the dial oscillated between 0 and 0.1; 600 seconds: 0 and 0.1; 1,000 seconds: 0.1 and 0.1.5; 1,500 seconds: 0.1 and 0.2; 2,000 seconds: 0.1 and 0.2; 3,000 seconds: 0.2 and 0.3; 6,000 seconds: 0.2 and 0.3.5; 10,000 seconds: 0.4 and 0.5; 20,000 seconds: 0.5 and 0.6; 40,000 seconds: the dial went pass 1 and went right up to the end of the counter.

200. The rock appears at «grey». The «royal-blue» obtained varies from the other blues which were obtained with the molybdenite. Immediately after the irradiation of the mineral soaked in acid, the liquid is «olive-green» with «rusty orange» residues. The liquid becomes «blue» again when it is drying.

201. The note is cancelled.

202. For the matter at the bottom of the liquid, see «azure-blue»; for the solid, «mossy green».

202a. The colour corresponds to «phtalo-blue», as it is shown at no. 570 of the Talens - Rembrandt pastel chart.

203. A thick layer of «phtalo-blue» matter covers a thin layer of «dark brown» powder.

204. Partially «phtalo-blue» and partially «dark iron-grey».

205. A thin black crust covers a thick layer of «phtalo-blue» matter.

206. A thick layer of «phtalo-blue» matter covers a thin «dark brown» layer.

207. Until 102.4 Mrad has been reached, the «greyish blue» is at the state of a tint and not of a colour as such.

208. With green spots at the surface.

209. The note is cancelled.

210. For the colour of the liquid, see «light green».

211. The «turquoise» pigment obtained undergoes no change perceptible to the naked eye, when it is soaked in the Kodak D19 photographic developer.

212. This amazonite rock, which has a «very powerful turquoise colour», undergoes no change perceptible to the naked eye, when it is irradiated with electrons at 164,800 rad.

213. After two years of soaking, the liquid and the solid are «azure-blue».

214. A «greenish blue» industrial pigment, copper arseniate, produced by the City Chemical Corporation of New York, #3240, does not undergo any change perceptible to the naked eye, when irradiated with gamma rays at 63.984 and 242.80 Mrad. At 602.804 Mrad, it becomes «light green». At 305,200 rad[73], it becomes a more bluish «greenish blue», more intense and vivid.

215. Crocodilite, at the state of a rock, undergoes no change perceptitible to the naked eye, when it is irradiated with electrons at 305,200 rad[73].

216. Crocodilite, at the state of a rock, undergoes no change perceptible to the naked eye, when it is irradiated with gamma rays at 5 and 10 Mrad.

217. For the colour of the solid, see «light green».

217a. The colour corresponds to «phtalo-green», which is shown at no. 675 of the chart of the pastels of the Talens-Rembrandt Company.

218. This sample is a reference which allows a comparison with the results obtained, when the same mineral is irradiated before being treated with heat (see at «apple-green»).

219. For the colour of the solid, see at «green».

220. The rock is partially translucent. It is divided in two parts: one is «blue»; the other, «light grass-green». The «blue» differs from the «peacock-blue» obtained after irradation with electrons at 164,800 rad.

221. The colour obtained, following the irradiation, is more uniform throughout the rock than was the original colour.

222. When the combination is 1 g of matter + 20 ml ammonia, the resulting pigment is «very intense greenish blue»; I would say mostly «peacock-blue».

223. Immediately after it is put on the hot plate, the liquid is a translucent «light blue» and, the solid, «white with blue reflection».

224. A thick layer of a «greenish blue» matter covers a thin layer of «blackish brown» matter.

225. See note 218.

226. For the colour of the 2nd liquid, see «blue»; the 3rd liquid, «greenish turquoise»; the solid, «pale greyish green [orange tone]».

227. The pigment, produced in these conditions, is essentially «dark greenish blue», with a «dark grey area».

227a. The colour corresponds to «peacock-blue», such as it appears in the Prismacolor color chart for markers at no. PM 125, which is joined to this document.

228. Did not undergo any change perceptible to the naked eye, when irradiated with electrons at 164,800 rad.

229. For the colour of the solid, see «olive-green».

230. The mineral remains semi-opaque until it reaches 247.6 Mrad.

231. The fluorine, at the state of a rock, is divided in two parts starting from 287.3 Mrad until 424.7 Mrad. One is «intense peacock-blue» and nears «royal-blue», while the other is «very powerful grass-green».

232. The fluorine is opaque from 287.3 Mrad to 424.7 Mrad.

233. The rocks are slightly more opaque than those irradiated in the same conditions without, however, having been previously heated.

234. Concerning the translucence, the rocks are more milky and opaque than those heated at 600 °F and irradiated in the same conditions.

235. For the colour of a) see «intense emerald-green»; b) «light apple-green»; c) «olive-green (light yellow tone)»; d) «olive-green without yellow tone»; f) «olive-green (light yellow tone)» less intense than c).

236. The crystals are «bluish green» in a «very pale apple-green» powder.

237. The fuel oil soot becomes «green», when the sodium carbonate predominates.

238. The colour is slightly more intense than with the combination (2 g + 2 g of sodium carbonate) heated 0†1500 °F.

239. The sample, irradiated with electrons at 162,431 rad, undergoes no perceptible change to the naked eye.

240. The mixture is deposited in a porcelain crucible for heating. The surrounding of the resulting pigment is «intense bluish green», with a «grey» matter at the bottom of the crucible.

241. The light green apatite underwent no change perceptible to the naked eyed, when it was soaked in the Kodak D19 photographic developer, after having been irradiated with neutrons.

242. After the first treatment, the pigment may also be qualified as being «light yellowish green». The «grey bluish green» obtained after the irradiation differs from the one obtained after the pigment was heated at 1100 °F.

242a. For the colour of the liquid, see «turquoise green».

243. Starting at 287.3 Mrad, the sample takes on, in certain cases, a «brown tone», which gives it the appearance of an «olive-green» while still becoming more accentuated and dark.

244. For the colour of the light green apatite, irradiated at the state of a powder, see at «green».

245. The colour has changed and has become considerably more accentuated.

246. During the first step of the drying, the solution is brought and maintained to the boiling state until the colour, which at this point is «orange», becomes very saturated. This «orange» then transforms itself into a «pronounced emerald-green», which, during the drying or heating process, becomes «light greenish turquoise».

247. The smallest particles are still «beige-grey», though «darker»; the particles, which come next in size but are still very small are an «accentuated greenish turquoise».

248. For the colour of the solid, see «yellowish green».

249. Since the liquid and the solid were not separated after the soaking, it follows that the cristals on the surface should result from this liquid and the powder, which rests at the bottom, from the solid. For the colour of the powder, see «orange-beige».

250. The granules are of the size of coarse salt.

251. The «greenish turquoise» progressively becomes darker and more accentuated. The category of the «green» also changes progressively to «phtalo-green».

252. A layer of «greenish turquoise» matter covers some grey graphite, which was not amalgamated.

253. Here is the calibre which allows a comparison with the mineral, which has been irradiated before receiving the same treatment. For the colour of the latter, see «apple-green».

254. There is a deposit of «greenish turquoise» matter on another matter, which is «light greenish yellow». For the colour of the solid, see «light green [light blue tone]».

255. For the colour of the liquid, see «apple-green». The solution is composed of 5% of potassium cyanide and 95% of distilled water.

Approximately 400 minerals, at their natural state or after having been treated, were soaked in this solution without undergoing any change of colour perceptible to the naked eye. Here are a few of them, whose serial number in the system is indicated: white microcline: natural (89) and heated (0↑1900 °F); tremolite: natural (131) and heated (0↑1900 °F - 0↑2000 °F); tungsten: natural (9890) and heated (0↑2000 °F); iron sulphide - nickel[353]: natural (2136) and heated (0↑1300 °F - 0↑1700 °F); smoky obsidian: natural (134) and heated (1000 °C / 1 h); wilsonite: natural (136) and heated (0↑1900 °F); cobalt sulphide[597]: natural (2047) and heated (0↑2000 °F); almandite: natural (1440) and heated (1400 °F / 1 h - 0↑1900 °F - 0↑2000 °F); cryolite: natural (57) and heated (1600 °F / 1 h - 0↑1900 °F - 0↑2000 °F); molybdenite[48]: natural (223) and heated (0↑1900 °F); smaltite[25]: natural (113) and heated (1400 °F / 1 h - 0↑1900 °F); sandstone: natural (2240) and heated (0↑1700 °F - 0↑1900 °F); grey steatite: natural (367) and heated (0↑2200 °F); red zincite: natural (272) and heated (0↑1900 °F); magnetite: natural (86) and heated (0↑1900 °F); peridotite: natural (100) and heated (0↑1900 °F); glass powder (4738); chalcocite: natural (50) and heated (1400 °F / 1 h - 1700 °F / 1 h - 0↑1900 °F / 1 h - 1600 °F / 1 h); barite: natural (30) and heated (1500 °F to 1900 °F); chromite: natural (1564) and heated (0↑1900 °F); anorthosite: natural (19) and heated (0↑1900 °F); haematite: natural (630) and heated (1400 °F / 1 h - 1600 °F / 1 h - 0↑1800 °F - 0↑1900 °F); granite gneiss: natural (1442) and heated (0↑1900 °F); olivine: natural (94) and heated (0↑1800 °F); cerite: natural (47) and heated (0↑1900 °F); pentlandite[102]: natural (628) and heated (0↑1900 °F); uraninite: natural (98) and heated (0↑1900 °F); yofortierite[87]: natural (270) and heated (1400 °F / 1 h - 1600 °F / 1 h - 0↑1900 °F); analcime: natural (14) and heated (0↑1900 °F - 0↑2000 °F); pyrochlore: natural (267) and heated (0↑1900 °F - 0↑2000 °F); armenite: natural (262) and heated (0↑1400 °F - 0↑1900 °F); apophyllite: natural (28) and heated (0↑1900 °F - 0↑2000 °F); diopside: natural (59) and heated (0↑1900 °F - 0↑2000 °F); polylithionite: natural (3447) and heated (0↑1900 °F - 0↑2000 °F); pyrrhotite[276]: natural (1500) and heated (1000 °C / 1 h); nickeliferous pyrrhotite[23]: natural (105) and heated (0↑1900 °F); pyrophillite: natural (103) and heated (0↑1900 °F - 0↑2000 °F); rutile: natural (109) and heated (0↑1800 °F - 0↑2000 °F); spodumene: natural (117) and heated (0↑1900 °F); tourmaline: natural (7397) and heated (0↑2000 °F); corundum: natural (55) and heated (0↑1900 °F); stibnite: natural (122) and heated (0↑1900 °F - 0↑2000 °F); sodalite: natural (1010) and heated (0↑2000 °F); pink calcite: natural (140) and heated (1000 °C / 1 h - 1600 °F / 1 h - 0↑1800 °F); sphalerite[27]: natural (115) and heated (0↑1800 °F); 1 g of pyrochlore (267) + 1 g of bauxite[92] (546), heated (1900 °F / 1 h); asbestos[4]: natural (11) and heated (1900 °F / 1 h - 0↑2100 °F); crocidolite: natural (692) and heated (1600 °F / 1 h - 0↑2000 °F); 1.50 g of cement[82] (621) + .50 g of chromite[294] (1635), heated (1000 °C / 2 h); .25 g of cement[269] (1486) + 1.50 g of chromite[294] (1635), heated (1525 °F / 1 h); 1.50 g of cement[269] (1486) + .50 g of chromite[294] (1635), heated (1000 °C / 2 h); 1.50 g of pink calcite (140) + .50 g of chromite[294] (1635), heated (1850 °F / 1 h); 1.50 g of cement[82] (621) + .25 g of chromite[294] (1635), heated (1675 °F / 1 h); white dolomite: natural (204) and heated (1000 °C / 1 h); grey dolomite: natural (185) and heated (1000 °C / 1 h); violet fluorine: natural (65) and heated (1000 °C / 1 h); yellow fluorine: natural (68) and heated (1000 °C / 1 h): pinkish white fluorine: natural (329) and heated (1000 °C / 1 h): lilac-grey fluorine: natural (70) and heated (1000 °C / 1 h); pinkish lilac fluorine: natural (73) and heated (1000 °C / 1 h); galena: natural (569) and heated (1200 °F / 1 h); gypsum: natural (77) and heated (1000 °C / 1 h): red shale[359] [formation of Sillery]: natural (2207) and heated (0↑2000 °F); cement[82]: natural (621) and heated (0↑1800 °F); cement[269]: natural (1486) and heated (0↑1800 °F): orange ochre[20]: natural (96) and heated (0↑1900 °F); quartz-mica[96]: natural (581) and heated (0↑1850 °F); oil soot[86] (526); goethite[106]: natural (603) and heated (0↑1300 °F[107] - 0↑1800 °F); silica[91]: natural (537) and heated (0↑2300 °F); calcite[11] (34); yellow ochre[98]: natural (607) and heated (0↑1800 °F); olivine (92); serpentine: natural (563) and heated (0↑1000 °F - 0↑2200 °F); graphite (1138); actinolite: natural (1278.1) and heated (0↑1900 °F); amethyst (276); andulusite: natural (17) and heated (0↑1900 °F); green agate: natural (1569) and heated (0↑2000 °F); anorthosite: natural (583) and heated (1000 °C / 1 h); dark green apatite: natural (534) and heated (1000 °C / 1 h); light green apatite: natural (285) and heated (1000 °C / 1 h); brown apatite: natural (521) and heated (1000 °C / 1 h); red apatite: natural (24) and heated (1000 °C / 1 h); amazonite: natural (1159) and heated (1000 °C / 1 h); antigorite: natural (111) and heated (1000 °C / 1 h); bauxite[92]: natural (546) and heated (0↑1700 °F);green beryl: natural (32) and heated (1000 °C / 1 h); blue beryl (410); serandite: natural (2931) and heated (1000 °C / 1 h); siderite (366): natural and heated (1000 °C / 1 h); sericite shale: natural (196) and heated (1000 °C / 1 h); zinc concentrate grilled at 1000 °C (165); chromite[294]: natural and heated (1000 °C / 1 h); chalcopyrite: natural (1482) and heated (1000 °C / 1 h); coal (1484); fluorescent calcite: natural (247) and heated (1000 °C / 1 h); chrysocolla (934); copper concentrate (936); hypersthene: natural (1813) and heated (1000 °C / 1 h); halite (163): haematite: heated (0↑1800 °F); green hornblende: natural (79) and heated (0↑2000 °F); ilmenite: natural (5817) and heated (1000 °C / 1 h); jade: natural (2042) and heated (0↑2000 °F); kaolin: natural (81) and heated (0↑1900 °F); labrador: natural (211) and heated (1000 °C / 1 h); malachite (487); mica: natural (190) and heated (0↑2000 °F); molybdenite[103]: natural (645) and heated (0↑1100 °F); pyrolusite[101]: natural (624) and heated (0↑2000 °F); beige orthoclase: natural (194) and heated (1000 °C / 1 h); white orthoclase: natural (192) and heated (1000 °C / 1 h); pyrite (2929); iron pyrite (2188); green steatite: natural (119) and heated (0↑1700 °F - 0↑2200 °F); sphalerite[31] (128): heated (0↑1900 °F); labradorite: natural (22); colourless fluorine: natural (174) and heated (1000 °C / 1 h); brownish green apatite: natural (26) and heated (0↑1600 °F - 0↑2200 °F).

256. For the colour of the solid, see «greyish green».

257. The 2nd liquid is composed of «vivid blue» cristals and of an «acute greenish turquoise» powder. For the 1st liquid, see «emerald-green» and «apple-green»; for the solid, «grass-green». The conditions of these tests could vary. For example, after the removal of the 1st liquid, an acid, different from the nitric acid, or a combination of acids could be added, which would cause variations of colours.

258. For the colour of the solid, see «light greenish turquoise».

259. The colour remains the same, but it becomes considerably more intense, mostly at 102.4 and 424.7 Mrad.

260. 1) When both are not separated, the liquid may be distinguished from the solid by the fact that it transforms itself into cristals or a layer of coloured powder resting on top of another layer of matter which has another colour. 2) The pigments, resulting from the application tests of the bornite into nitric or hydrochloric acid or the combination of both of them, and which were kept in a dark smoky glass bottle, have maintained their original colour, while the colours of the pigments placed in transparent glass bottles have changed. The «apple-greens» and the «yellows» have taken on an orange or brownish tone.

261. After two years of soaking, the liquid is «emerald-green». After two days of drying, the liquid becomes «acute violet». Eight days later, the liquid has become «greenish turquoise». For the same test, after two weeks of soaking, see «khaki-green».

262. At 63.88 Mrad, there is no change perceptible to the naked eye.

263. Following the drying attempt, the liquid is composed of two layers of colours: at the surface, there is a «pronounced olive-green»; at the bottom, a «dark greenish turquoise». For the solid, see «black».

264. For the colour of the solid, see «orange».

265. This note is annuled.

266. The colour is located in the areas of the chrome particles.

267. For the solid, see «blue».

268. For the colour of the liquid, see «dark green».

1924

269. The semi-quantitative spectrographic analysis of the cement reveals the following: %Elmt: 9.338 SiK / 2.122 K K / 4.066 FeK / 1.180 AlK / 82.631 CaK / 669 S K / .000 CrK for a total of 100.006.

270. Asbestos, coming either from Asbestos or the crocidolite from Africa, introduces a difficulty when it is grinded with sodium or potassium carbonate. The carbonate powder slides inevitably on the asbestos fiber. It follows that the two components do not amalgamate when they are grinded. But these two components need to be amalgamated in order to interact one upon the other when heated. The results, which are now being presented (.50 g of asbestos + .50 g of carbonate), are a good example of this phenomenon. Only part of the fib s have entered into action with the carbonate. This explains the presence of two colours, that is to say «beige» (colour of the asbestos which did not enter into action with the carbonate) and «light green» (colour of the asbestos which entered into action with the carbonate). However, when the asbestos has been previously treated with hydrochloric acid, the carbonate clings to the fiber easily (see «green»).

271. For the colour of the liquid, see «greenish blue».

272. For the colour of the liquid, see «bluish green» and «apple-green».

273. For the colour of the solid, see «blue».

274. Weak «light green».

275. In the depth of the rock. The rock, when irradiated in its natural state, at 604.53 Mrad, becomes «greyish beige». The «light green», obtained in this case, and the «greyish beige» are of equal intensity, even though one of the rocks has received a much more intense dosage of irradiation. The microcline, which is simply soaked at the state of a powder in the same acid, becomes «light yellow».

276. The semi-quantitative spectrographic analysis of pyrrhotite may be read as follows: %Elmt: .444 MgK / .054 AlK / .741 SiK / 34.210 S K / 4.806 CaK / 50.729 FeK / .001 NaK / .120 K K / 8.897 NiK for a total of 100.001.

277. The colour could be as well described as being «pale lemon-yellow [green tone]»).

278. «Green» more powerful that the colour of the green steatite.

279. For the colour of the liquid, see «mint-green».

280. The galena forms a permanent and adherent glaze.

281. The glaze has two areas: a) brilliant: dark green / orange-brown / iron-grey; b) mat: yellow / orange.

282. Part of the glaze is mat and «yellow / orange». The mass of the piece of cement has a «red tone» after heating.

283. There is a «grey» powder at the surface with a «green» mass in its depth.

284. The mixture of these two colours gives a global visual aspect of «yellow ochre».

285. The rock is «green» in its depth.

286. This green is «unnameable» because it does not resemble any other green which I have seen.

287. The «accentuated green» remains the same from 63.984 to 254.204 Mrad.

288. The green beryl, at the state of a rock, undergoes no change perceptible to the naked eye when it is irradiated with gamma rays at 65.704 Mrad, nor when it is irradiated at the state of a rock with electrons at 305,200 rad[73].

289. The majority of particles are «green»; some, the smallest, are «medium greyish beige».

289a. For the colour of the solid, see «khaki-green».

290. The observation is done with the naked eye, at the surface of the rock and not in its interior. Generally, the surface becomes slowly and progressively yellowish. In its depth, the malachite takes on a «light blue tone».

291. At this point, the colour of the rock is more accentuated than at other dosages and is more blue. It is somewhat an exception.

292. The colour, while maintaining the same denomination, becomes more pastel, whitish or less saturated.

293. The colour passes from «medium» to «light».

294. The analysis by X ray spectrofluorescence of the chromite reveals the following. Dosage %: 7.64 Mg / 12.06 Al / 20.10 Si / 49.33 Cr / 10.85 Fe.

295. This note is annuled.

1926

296. A second test (4 g + 100 ml of sulphuric acid / soaking: 4 years / separation of the liquid and the solid / drying on hot plate) gives the following. After two days on the hot plate, the liquid passes from «light amber» to «greenish turquoise». Six days later, it is «dark milky chocolate-brown» and (I presume) has burned. The solid, after two years of soaking, is «dark brown»; after eight days on the hot plate, it is «medium caput-mortuum (violet tone)» and (I presume) has burned.

297. Has the texture of coarse salt, but resembles candy. See the colour of the 1st liquid at «apple-green». At the time of the removal, the 2nd liquid is «apple-green». After the drying attempt, it is composed of two intensities of «apple-green», being lighter at the bottom than at the surface. After resting for a while, the second liquid becomes «mint-green».

298. The colour resembles «green malachite».

299. The semi-quantitative spectrographic analysis of the crystals gives the following. %Elmt: 6.19 MgK / 0.97 S K / 5.64 FeK / 50.62 NiK / 36.54 SbL.

300. The «green» becomes lightly and progressively more accentuated at each step. It becomes remarkably more intense than at 360 Mrad.

301. At this temperature, the sample is slightly darker than at the previous and following temperatures.

302. The colour is similar to the «dark green» streaks present in a rock of malachite.

303. This note is annuled.

304. The pigment is mostly «very light beige».

305. At 5, 10, 57.4 and 65.704 Mrad, there is no change perceptible to the naked eye.

306. «Dark evergreen» in some areas and «dark greyish brown» in others.

307. Up to 148.4 Mrad, the colour of the mineral has always remained the same, but has become more accentuated and darker.

308. For the colour of the solid, see «medium phtalo-green».

309. This note is annuled.

310. For the colour of the matrix of the crystal, see «yellowish green».

1927

311. The «green» is considerably more accentuated and dark than at 287.3 Mrad.

312. For the colour of the liquid, see «dark phtalo-green».

313. This is part of a series of colours ranging from «green» to «blue», produced by varying the proportions of hydrochloric acid and nitric acid which are combined together. As mentioned in a previous note, the binary, compound and quaternary combinations of acids will give different scales of colours. Furthermore, the addition of ammonia, according to various proportions, will equally give a new variety of colours. This note may be applied to all the results obtained when using copper or a mineral which is linked to copper.

314. For the colour of the liquid, see «phtalo-green».

315. For the colour of the liquid, see «emerald-blue».

316. The colour is in fact a tone located on the circumference of the piece of cement.

317. At 5.7, 11.4 and 17.91 Mrad, there is no change perceptible to the naked eye.

318. Having noted that the part of the cement powder, which is in contact with the stainless steel sheet on which it is deposited, becomes «green» when heated, I made approximately 90 tests to determine which minerals reacted with which components of the stainless steel. I used powdered zinc, chrome and nickel. Seven minerals, amongst which calcite[11] (34) and two cement[82,269] powders (621,1486) reacted with chrome. Another mineral, which is «grey», also reacted with chrome. Its semi-quantitative spectrographic analysis may be read as follows. %Elmt: 8.549 SiK / 2.498 K K / 4.715 FeK / 1.425 AlK / 81.999 CaK / .614 S K / .206 CrK for a total of 100.006.

319. The analysis by spectrofluorescence of two «green» pigments which were obtained by heating a mixture of calcite (34) and chromite (1635), was done at two different temperature degrees. In both cases, the proportions of the components were the same. In order to facilitate the comparison, we have analyzed two «green» pigments obtained by heating at the same temperatures a mixture of calcite (34) and chrome (40), according to the same proportions as in the case of the chromite and the calcite. Here are the results. For the chromite and the calcite, heated at the first chosen temperature, the results obtained with the «green» pigment may be read as follows %: .10 Mg / .78 Al / 1.96 Si / 94 Ca / 1.32 Cr / 1.52 Fe / .32 Ni for a total of 100% (without Z.A.F. correction). When heated at the second chosen temperature, the «green» pigment obtained is analyzed as follows %: .12 Mg / 4.44

Al / 6.67 Si / 75.49 Ca / 7.09 Cr / 5.93 Fe / .34 Ni for a total of 100% (without Z.A.F. correction). For the chrome and calcite combination heated at the first chosen temperature, the «green» which is obtained is analyzed as follows: %: 4.66 Mg / 6.6 Al / 8.9 Si / 69.11 Ca / 4.6 Vt z 5.47 Fe / .8 Ni for a total of 100% (without Z.A.F. correction). At the second chosen temperature, the analysis of the «green» pigment obtained reveals the following: %: .22 Mg / .12 Al / 1.75 Si / 59.5 Ca / 35.88 Cr / 2.2 Fe / .4 Ni for a total of 100% (without Z.A.F. correction).

320. The best reaction obtained is when a) the two components are in equal proportions; b) the temperature is at 1000 °C; c) the reasonable duration of exposition is 2 h.

321. The scales of «green», obtained by heating the calcite and chromite mixture, as well as the cement or calcite and chrome mixtures, could differ by varying the heating process. A) Instead of depositing the pigment at the determined temperature during one hour, it could be deposited in the furnace at 0 °F and the temperature could be risen to a chosen point, and the sample could be immediately removed or (it is important to proceed uniformly throughout the process) be left for a chosen time, once the temperature is reached or it could be left to cool slowly in the furnace until the ambient temperature is reached. B) The sample could have been humidified before, during and after the heating, in order to vivify the colour. C) The pigment could have been regularly stirred during the heating, to allow the oxygen to penetrate the pigment, process which vivifies and even modifies the colour. The present observations may be applied to all the colours obtained by heating.

322. Here is the threshold point.

323. In this case, the «grass-green» is much more intense than when the natural amazonite, at the state of a rock, is irradiated with gamma rays at 122.984 Mrad. It is also different from the «green» obtained, when the amazonite, at the state of powder, is soaked in hydrochloric acid, dried and irradiated.

324. The best reaction is obtained when: a) the cement predominates (1.50 g + .50 g of chromite) in the combination; b) the temperature is at 1000 °C; c) the duration of the heating is 2 hours.

325. The colour is less intense than when the heating lasts 2 hours. However, it is equivalent to the «green» obtained with the chrome heated during 1 hour.

326. A «grass-green» layer of matter covers a «brown» crust.

327. The colour has no «yellow tone».

328. The cryolite, mixed either with chrome or nickel or either with a combination of both of them, and heated could give a variety of scales of green, when proceeding in a manner similar to the one used when heating the chrome with the calcite or cements. The same comment may be applied to the combination of mussel powder with chrome.

329. Unlike the previous pieces where the colour was located in certain areas only, in this case, the colour is spread throughout the sample.

330. The «grass-green» is more accentuated than the colour of the mineral at the state of a rock.

331. Unless it is otherwise mentioned, the pigments used to build the three scales were dry. When they are humidified, the colours are more vivid and intense.

332. «Vivid and luminous grass-green», comparatively to the result obtained when the mixture is dry.

333. «Dark grass-green», comparatively to the result obtained when the mixture is humidified.

334. The colour is a «dark grass-green», similar to the colour of the bloody agate at the state of a natural rock.

335. The colour becomes very slightly more brown starting at 360 Mrad.

336. The colour is less green, but has the same intensity.

337. The colour is lighter when the combination is heated at the same temperatures and according to the same proportions, but for 2 hours. However, it is equivalent to the one obtained with the combination of the calcite and the chrome, heated during 1 hour.

338. The colour nears the one obtained at 1700 °F with the combination of 1.50 g of calcite and .50 g of chrome.

339. The main change in colour occurs at this temperature (threshold point).

340. Cryolite, combined either with chrome or nickel or with both of them or either with chromite, could give different series of green. These series could be done according to the same principle as the series of green obtained by combining calcite or cements with chrome. This comment may also be applied to mussel powder combined with chrome.

341. <u>Inversion of the proportions at the threshold temperature:</u>
The inversion of the proportions could have been done:

a) according to other quantities b) and at every determined point of the scale. This inversion proves that we could obtain an infinite scale of greens by varying the conditions. Thus, we could build an entirely new range of greens.

342. The «green» aspect becomes more accentuated.

343. The best reaction is obtained when a) the cement predominates; b) the temperature is at 1000 °C; c) the duration of the heating is 2 hours.

344. At 5, 10 and 57.4 Mrad, there is no change perceptible to the naked eye.

345. During the boiling, the liquid becomes «intense greenish blue».

346. The solid is covered with a liquid composed of two layers of colours. The solid itself is composed of two colours: a) the one, of which we are presently speaking, is at the bottom; b) the layer at the surface is «emerald-green».

347. For the colour of the liquid, see «apple-green» and «white».

348. A test (4 g + 100 ml of hydrochloric acid / soaking: 4 years / drying on hot plate) gave the following results. After two years of soaking, the liquid is «yellowish green» and opaque; the solid, «greenish yellow». Afterfour years, when dried on the hot plate (grade 4) during 3 consecutive days, the «yellowish green» liquid and the «greenish yellow» become «medium orange-brown», but the liquid is more orange and light than the solid. The pigment, after the heating process which lasted too long, was burned or became oxidized. Therefore, it is better to dry it naturally or by desiccation or on a sand bath.

349. This note is annuled.

350. The powder is «green» with a few «brown» particles.

350a. For the colour of the solid, see «yellow».

351. When irradiated with electrons at 305,082 rad (155,082 rad + 150,000 rad), there is no change perceptible to the naked eye.

352. The sample did not undergo any change perceptible to the naked eye when it was irradiated with X rays with a Philips therapeutic apparatus used usually for medical purposes, during 4 hours with 448 «shots» at each interval of 30 seconds during 1/10 of a second at 100 milliamper and at 70 kV at a distance of 40 inches.

352a. After two years of soaking in the acid, the solid is composed of three layers of colours, ranging from top to bottom: «emerald-green», «medium iron-grey» and «greyish brown». After four years, the solid, covered by the liquid, is composed of two layers of colours: a) «emerald-green» at the surface; b) the layer underneath: «dark grass-green (grey tone)». The liquid is also composed of two layers of colours: a) «apple-green»; b) the layer underneath: «white».

353. The semi-quantitative spectrographic analysis of this mineral from Saint-Fabien-de-Panet, may be read as follows: %Elmt: .014 MgK / .053 AlK / .495 SiK / 30.889 S K / .146 AK / 66.031 FeK / 0.17 NaK / .009 K K / 2.346 NiK / for a total of 100.001.

353a. For the colour of the solid, see «grass-green».

354. 155,082 rad + 140,400 rad = 305,082 rad.

355. At the threshold of «greenish brown».

355a. For the colour of b), see «light apple-green»; c), see «olive-green [light yellow tone]»; d), see «olive-green [without any yellow tone]»; f), see «olive-green [light yellow tone]», less intense than c).

356. While becoming more opaque, the «green» becomes more attenuated and brown.

356a. In this case, the graphite and the carbonate were amalgamated.

357. For the evolution of the colour of the garnet, see «phtalo-green».

357a. For the colour of the 2nd liquid, see «bluish turquoise» and «greenish turquoise»; for that of the solid, see «grass-green».

358. The colour becomes more and more brown as if the pigment was drying up.

358a. When dry, the pigment is «soot black». Il slowly dilutes in water and reacts as a dye. In fact, it reacts in the same manner as did the pyrolusite which was previously heat treated with sulphur, except for the fact that the «green», obtained with galena, is more intense and vivid than the one obtained with pyrolusite, which is itself quite powerful.

359. The analysis done by X ray diffraction, with the aid of a 6351 Cu spectrum, of the red shale (formation of Sillery) from Berthier-Sur-Mer, may be read as follows: major phases: feldspar, quartz / minor phase: chlorite / phase in traces: mica. The margin of a semi-quantitative spectrographic analysis may be read as follows: %: Si 10-50 / Al,K,Fe 2-10 / Na,Mg,Cu 1/2-2 / P,Ti 0,1-1 / Mn,Ba 0,05-0,5 / Zn,Sr,Zr 0,01-0,1 / Cr,W 0,005-0,05 / B,Co,Ni,Cu,Sb,Pb 0,001-0,01 / Be,Sn <0,001.

359a. At 1500 °F and 1600 °F, a layer of «light bluish turquoise» matter, on the one hand, and of «dark bluish turquoise», on the other hand, covers a layer of grey graphite. The graphite and the potassium carbonate were not sufficiently grinded together, in order that they amalgamate. Consequently, the reaction did not occur normally at these two temperatures. But they could have occurred if the grinding had been proper. It is also the case for the graphite and sodium carbonate combination. The carbonate seems to slide on the graphite. They do not seem to be integrated. However, the reaction did occur at 1700 °F and 1800 °F.

360. When heated at 300 °F during 10 minutes, the verdigris reacted similarly to the copper carbonate, the copper arsenate and the copper arsenite, which respectively become, when heated at 450 °F during 10 minutes, «light mossy green», for the first two pigments, and «mossy brown» for the third one.

360a. All the «emerald-greens» obtained with the 2/3 combination are more brilliant and luminous than those obtained with the 1/3 combination.

361. For the colour of the 2nd liquid, see «blue» and of the 3rd liquid, see «greenish turquoise».

361a. When the pigment is humidified with water coming from the tap, it becomes «emerald-green», which is more brilliant and less dark than the one obtained with another combination (1 g + 3 g of potassium carbonate) and humidified with water. The first pigment obtained appeared to be «blackish green» when it was at the state of a dry powder, that is to say before the powder was diluted in water.

362. The colour is more accentuated and uniform than when the diopside, at the state of a natural rock, is irradiated at 122 Mrad. This type of test could be applied to the acids and their various combinations.

362a. The «emerald-green» is darker, more blackish than the one obtained with another combination (2 g + 3 g of potassium carbonate) heated at the same temperatures. When it is at the state of a dry powder, it appears to be «dark grass-green».

363. The smallest particles are «grey»; the biggest, «green».

363a. This «very intense emerald-green» appears to be black. Once it is diluted in water, the liquid becomes «intense green», but a bit of a black residual matter remains at the bottom of the liquid. The same phenomenon occurs for the pyrolusite.

364. This «green» differs from the one obtained with crocidolite, irradiated at its natural state.

364a. Maintains its «brown tone», when diluted in water.

365. It is the same colour which darkens.

366. The powder is, in appearance, «black». However, when it is diluted in water, the liquid becomes «green» and a residual «black» matter remains at the bottom of the liquid.

366a. At 1800 °F, the pigment seems to be «dark grass-green», when it is at the state of a dry powder.

366b. The effect is identical, when the three components are mixed together from the beginning and heated just once.

367. The «very intense bluish green» appears to be «black». Once it is diluted in water, the liquid becomes «intense green» and a «black» residual matter remains at the bottom of the liquid. The same phenomenon occurs with pyrolusite.

367a. The pigment is «black» in appearance.

368. Certain crystalline and translucid particles became «light olive-green»; others, which range from the translucid to the opaque, became «brownish grey» darker than the calibre.

368a. When the powder is diluted in water, the colour has a «brown tone».

369. This «green» is similar to the «olive-green».

369a. The pigment has no brown tone. In appearance, it is «dark grass-green».

370. For the colour of b), see «apple-green».

370a. All these pigments, when they are diluted in water coming from the tap, become «very intense emerald-green» (of various intensities). After soaking for a few seconds, the water becomes «vivid crimson».

371. The combination (2 g + 2 g of sodium carbonate), heated 0↑1500 °F, does not give any interesting change of colour.

371a. All of the samples, heated up to 8 hours, are «black» in appearance, when they are at the state of powder. Once it is diluted in the water coming from the tap, the liquid takes on the indicated colour.

372. This «olive-green» is slightly lighter than the one obtained with the combination (2 g + 2 g of potassium carbonate) heated 0↑1800 °F.

373. The colour is slightly lighter than the one obtained with the combination (2 g + 2 g of potassium carbonate) heated 0↑1800 °F.

374. The smallest particles become «medium brownish grey»; the biggest, «medium olive-green».

375. This «olive-green» resembles «brownish green».

376. For the colour of the liquid, see «peacock-blue».

377. The colour is more green, less «orange-brown».

1934

378. For the colour of the solid, see «apple-green» and «olive-green».

379. This note is annuled.

380. The rock maintains the same translucence throughout the process.

381. The colour est darker and more opaque than when the natural serpentine is irradiated at the same dosage.

382. At 5 and 10 Mrad, there is no perceptible change to the naked eye.

383. With «orange reflection».

384. The serpentine, at the state of powder, does not undergo any change perceptible to the naked eye, when it is irradiated during 2,000 seconds at $10^{12}$ neutrons / $cm^2$ / sec. Also, there is no perceptible change when it is afterwards soaked in the Kodak D19 photographic developer.

385. The colour obtained is more «lichen-green» than «olive-green». With the combination (1 g of sandstone + 2 g of potassium carbonate), heated 0↑1800 °F, the «green» is more «olive-green» than «lichen-green».

386. We measured the exactness of the furnace's pyrometer with a thermocouple. During two days, I tested the reactions of the pyrometer. I found that there was a variation ranging from 20 °F to 50 °F between the thermocouple and the pyrometer. I therefore used the pyrometer.

387. The threshold point: the point where the reaction starts.

388. This is the point where the change in colour is the most acute.

389. At 1800 °F, the pigment melts a bit, but remains essentially at the state of powder.

390. The colour of a) is «intense emerald-green»; b) «light apple-green»; c) «olive-green (light yellow tone)»; d) «olive-green (without any yellow tone)»; f) «olive-green (light yellow tone) less intense than the colour of c).

391. The colour is of the phosphorescent type. For the colour of the liquid, see «azure-blue».

392. The colour is more intense than with the combination: 1 g + 40 ml of hydrochloric acid. The tone of the colour is acute, being of the phosphorescent type.

393. The result of a first semi-quantitative spectrographic analysis of this «very vivid apple-green» industrial pigment may be read as follows: %Elmt: 1.303 P K / 30.162 AlK / 62.381 CaK / 1.142 TiK / 2.114 CrK / 2.896 CoK for a total of 99.998. A second analysis of the same pigment follows: %Elmt: 1.435 P K / 3.353 AlK / 95.384 CaK / .000 TiK / .000 CrK / .000 CoK for a total of 100.172. A third analysis of the same pigment reveals this: %Elmt: 2.866 P K / .091 AlK / 97.106 CaK / .000 TiK / .000 CrK / .000 CoK for a total of 100.063. Irradiated with gamma rays at 63.984 Mrad and at 242.804 Mrad, the pigment does not undergo any perceptible change to the naked eye.

394. The «lemon-yellow» powder becomes «orange» at 425.65 Mrad.

395. For the colour of the liquid, see «light apple-green».

396. For the colour of the liquid, see «olive-green».

396a. For the colour of the solid, see «lemon-yellow».

397. There are «apple-green» crystals with a fine «lemon-yellow» powder. For the colour of the solid, see «very light apple-green».

398. For the colour of the liquid, see «bluish turquoise».

399. For the colour of the liquid, see «pale apple-green».

400. The «very light green» at the surface becomes darker and darker when nearing the bottom.

401. For the colour of the calibre before irradiation, see «greenish blue».

402. The rock is slightly more opaque.

403. The rock maintains the same opaqueness.

404. This note is annuled.

405. This note is annuled.

406. After the drying attempt, the liquid is composed of two layers of the same colour, but they have two different intensities: at the surface, it is «light apple-green» and, at the bottom, «very light apple-green».

407. For the colour of the solid, see «pale apple-green».

408. The same mineral was previously irradiated and, afterwards, it underwent the same treatment. See at «azure-blue».

409. The crystals are «apple-green» with a «light and vivid lemon-yellow». After having been dried, the liquid changes into crystals, while the residual solid becomes a powder. They were not separated before the drying.

410. With «grey» particles.

411. In the area where the layer is thick, the colour, on the surface, is «apple-green» and, in the depth of the layer, it is «opaque grey». In the area where the layer is thin, the colour is «vivid sunny yellow».

412. In the area where the layer is thin, the colour is «orange-yellow».

413. The mass of the piece of cement became «light pinkish beige» after the heating.

414. The thinnest area is «apple-green». The circumference of the glaze is «orange».

415. «Green» with orange areas.

416. There are four layers of colours: 1) the liquid, which is composed of two layers of colours: a) «apple-green», b) which covers a «white» gelatine»; 2) the solid, which is also composed of two layers of colours: a) a more dense «emerald-green» gelatine at the surface, b) covering another layer of matter at the bottom, which is «dark greyish grass-green».

417. The «apple-green» differs from the one obtained with hydrochloric acid.

418. The observations of the results, obtained by irradiating with gamma rays, were generally done one year after the irradiation took place.

419. This note is annuled.

420. This note is annuled.

421. This pigment was well conserved after three years in a smoky dark brown glass bottle. For the colour of the pigment, which received the same treatment, but without having been previously irradiated, see «phtalo-green».

422. The «apple-green» is lighter than those obtained with another combination (1 g + 2 g of potassium carbonate), heated at one time 0↑1800 °F, at another 0↑1900 °F, to obtain «dark apple-greens».

423. The colour is less vivid than when the mineral soaks during five months in this acid.

424. See «yellow ochre» for the same mineral soaked in nitric acid.

425. The «apple-green», obtained with hydrochloric acid, is more accentuated than the one obtained with nitric acid in the same conditions and according to the same proportions. The first has a light «yellow tone» that the second does not have.

426. «Apple-green» lighter and a bit colder than the colour obtained with the same mineral at its natural state, treated with hydrochloric acid.

427. The colour is slightly more intense than the one obtained when the mineral at its natural state is treated in the same conditions.

1937

428. This colour is of a phosphorescent type. For the colour of the second liquid, see «vivid apple-green».

429. The semi-quantitative spectrographic analysis of the «apple-green» crystals may be read as follows: %WT: 4.27 MgK / 66.47 ClK / 11.80 CaK / 16.93 NiK.

430. This note is annuled.

431. See «greenish blue», for the anorthosite treated in the same conditions, without having been previously irradiated.

432. For the tremolite, which received the same treatment without having been previously irradiated, see «greenish turquoise».

433. At 65.704 Mrad, there is no change perceptible to the naked eye.

434. At 5.7, 11.4 and 17.91 Mrad, there is no change perceptible to the naked eye.

435. The colour is less intense than the colour of the first liquid.

436. This note is annuled.

437. The colour has the same intensity as the «phtalo-green».

438. For the 1st and 2nd layers, see «orange» and «greenish orange». The conditions could have varied for this test: 1) the container could be higher in order to receive a greater quantity of asbestos and other colours or qualities of colour could arise; 2) the duration of the soaking could vary or the drying could be immediate; 3) the transformation could be done in a controlled atmosphere.

439. The colour is more intense than «light yellowish green».

440. The colour is more intense than «light yellowish green», without being of medium intensity.

441. The defectiveness of the furnace resulted in a prolonged and unexpected heat treatment. My purpose was to heat this mixture 0↑1700 °F.

442. For the colour of the solid, see «greenish yellow». When the chalcocite underwent the same treatment, the liquid and the solid which were afterwards dried on the hot plate at grade 4, both became «medium orange-brown».

443. The «yellowish green» nears the «bluish green» obtained when the mixture (1.50 g of calcite + .50 g of chrome) was heated at 1700 °F during one hour.

444. For the colour of the liquid, see «dark yellowish green».

445. The serpentine, at the state of powder, irradiated with neutrons at $10^{12}$ neutrons per $cm^2$ per second during 2,000 seconds, does not undergo any change perceptible to the naked eye. There is also no change perceptible to the naked eye when the irradiated mineral is soaked in the Kodak D19 photographic developer afterwards.

446. The «green» is more accentuated than when the mineral is soaked in nitric acid according to the same proportions and in the same conditions.

447. For the colour at the surface, see «mint-green».

448. The colour of the 1st liquid is «light beige-cream»; that of the 2nd liquid, «light greyish beige»; that of the layer in the middle, «light creamy beige [tending towards brown]».

449. For the colour of the solid, see «bluish green».

450. For the colour of the liquid, see «orange».

451. For the colour of the liquid, see «beige».

452. At the end of two years of soaking, the liquid is «orange»; the residual matter, resting at the bottom of the container, is composed of two layers of colours: the one at the surface is «orange» and the one which is completely at the bottom is «greyish green».

453. For the colour of the solid, see «brown».

454. The «light yellow» becomes white at 63.984 Mrad and undergoes no change perceptible to the naked eye at 254.204 Mrad; it just remains white.

455. For the colour of the liquid, see «white».

456. The application of the results, which were obtained, according to this heating process gives blues which are different from those obtained by heating the molybdenite from the cold point and rising the temperature. In the present case, the mineral is deposited in the furnace, which is already heated at a chosen temperature, while, in the previous case, it was deposited in a cold furnace and the chosen temperature was progressively reached. In this last case, the mineral may remain in the furnace, while the temperature is maintained during a determined period of time once the temperature has been reached. Another heating process of the mineral, either at the state of powder or rock, consists in heating the mineral until the desired colour or tone is attained. However, this process is empirical and requires a lot of sensitivity and know-how to build visually harmonious series of colours or tones. This empirical process may be carried out by depositing the mineral at a given temperature and by varying the intervals between the removals of the samples of pigment while the furnace is maintained at this same temperature. Thus, by basing myself solely on the visual aspect of the pigment and without calculating the duration of the exposition to heat, I removed a first «light yellow» sample at 1300 °F; a second which was «light yellow [with "light green" reflections or traces]; a third, which was «beige yellow» and, a fourth, «intense yellow». When the temperature is high, shorter is the duration of the heating of the mineral. The heating process may also vary. For example, the heating may be progressive and be initiated at 0 °F or a given temperature (ex.: 500 °F) and then risen until it reaches a chosen temperature (ex.: 1400 °F). In every case, one thing remains sure: the colour varies when the mineral is heated from a low temperature to a high temperature or deposited at a temperature sufficiently high to modify it.

457. The colour is almost the same as when the temperature is at 1200 °F, except that the crystals are more numerous.

458. In this case, the «light Naples-yellow» darkens a bit (about two notches in the «Kodak Scale of Grey»). Every modification of the molybdenite is important because it has consequences for further transformations into blues and greens.

459. The Lafarge grey cement is composed of: 20.63% $SiO_2$ / 4.25% $Al_2O_3$ / 3.07% $Fe_2O_3$ / 63.20% CaO total / 0.43% free CaO / 3.25% $SO_3$ / 2.28% MgO / 6.08% $C_3A$ / 9.33% $C_4AF$ / 55.18% $C_3S$ / 17.51% $C_2S$ / 0.90% $Na_2O$ - 0.93% $K_2O$ / density: 3.5 times heavier than water. Normal type 10 Portland.

460. The «pale yellow» colour is located in the areas where the chrome particles are located.

461. At 302,831 rad, there is no change perceptible to the naked eye.

462. Another heating process could have been applied, for example, starting from 0 °F, rising the temperature and removing a sample at determined intervals (ex.: at every 50 °F or 100 °F).

463. a) In this case, after the heating, the asbestos could have been treated with nitric acid or with a solution composed of nitric acid and water or the nitric and hydrochloric acid or hydrochloric acid and water. b) Asbestos, heated in this case 0↑1900 °F, could have been heated at 1900 °F during a chosen time (ex.: 1 hour). c) Asbestos, heated 0↑1900 °F, was used in this case. However, the asbestos, heated at every degree from 0↑2,300 °F (and still higher), could have been used. Consequently, we would obtain other modalities of colour. d) When previously heated, asbestos is soaked in hydrochloric acid: either it is simply covered by the acid, without calculating the amount of acid; either it is put in a determined quantity of acid, which covers it entirely. e) The soaking may be prolonged or the drying is immediate.

464. The process could have been different. Instead of A): 1) heating asbestos; 2) applying it in an acid; 3) drying it, I could have done the opposite, that is to say B): soak asbestos in the acid; 2) dry it; 3) heat it in order to form a range of colours or tones. We could also take the pigment, obtained at A), and heat it successively with sulphur, sodium carbonate or a mixture of both. The same goes for B).

1940

465. After two years of soaking, the liquid and the solid are «light yellow».

466. The colour is more accentuated than the «yellow» obtained with hydrochloric acid.

467. The smallest particles are «light yellow», while the others, which are bigger, are either «pink», «grey» or «lilac». The colour of the biggest particles is not very accentuated and, consequently, it does not allow to identify it with certainty.

468. After twelve hours of soaking, «light yellow» crystals are formed.

469. After four days of soaking, all the tests, which were done with sulphuric acid, were of various pinks before the drying. During the drying process on the hot plate, the pink disappeared. Drying on the hot plate may destroy the colour.

470. The «yellow» is equivalent to the colour of the pigment, which soaked during two weeks. After the drying, the pigment was «white (pink reflection)».

471. The cryolite, at the state of powder, which is only treated with hydrochloric acid, gives a «white (yellow reflection)»; the rock, treated with hydrochloric acid and irradiated at 244.53 Mrad, «white (pink reflection)».

472. This case is particular. During the heating, the furnace became defective. Consequently, it reached 1400 °F but very slowly and I did not become aware of it immediately. Therefore, in order to determine the moment at which I should remove the crystals, I did not base my judgment on the «time» of exposure but on the appearance of the crystals.

473. The serpentine, at the state of powder, treated with hydrochloric acid, becomes «brownish orange»; at the state of rock and irradiated at 244.53 Mrad, «dark green».

474. The amount of acid may vary. The important thing is that the matter be entirely covered. The duration of the soaking may also vary. But when you are building a range of colours or tones, which you wish to be coherent, it is important that the pigment always be soaked during the same period and time and, also, exposed to heat during the same period of time. Otherwise, the colours obtained will not form an harmonious series.

475. The asbestos was insufficiently grinded (manually). Consequently, the fiber was attacked only on its surface. Essentially, it remains the same, though it becomes yellowish on the surface. However, this phenomenon reveals what could have been the transformation, if it had been entirely attacked by acid.

476. The permanent glaze has 2 areas: one is brilliant (yellow / orange); the other is mate (dark green / iron-grey / orange-brown).

477. After the first two weeks of soaking, the acid had dried naturally. A «yellow» powder had formed at the surface. I added 50 ml of acid and prolonged the soaking for two weeks. Immediately after the drying, it was «yellow». Approximately five years later, it became «pronounced beige».

478. The colour is uniformly «yellow», although the particles, which were used, have two colours: «yellowish white» and «brown».

479. The soaking may be more or less prolonged or the drying may be immediate. We then obtain different modalities of «vivid yellow». In this case, the container does not have the elongated form of a column (as the vertical container I used to have a few layers of colours). The major aspect is that asbestos must be entirely covered with acid and dried progressively on the hot plate.

480. For the colour of the liquid, see «yolk-yellow».

481. The «yellow» differs from the other yellows obtained with asbestos treated with acid. The longer is the drying process on the hot plate, the more it takes on an «orange tone». Contrarily to the other tests done with sodium carbonate, in this case, the asbestos was not heated in a furnace with carbonate. The two of them were grinded together and deposited directly in acid. After the soaking, they were dried on a sand bath.

481a. For the colour of the liquid, see «apple-green».

482. However, the «lemon-yellow» remains very vivid.

483. After two years of soaking, the liquid is «yellow» and, the solid, «light yellow». After the drying, there is a «creamy yellow (with "light brown" spots)» crust at the surface of the layer of «lemon-yellow» matter.

484. The pigment is «dark khaki-green» at the end of the soaking and «yolk-yellow» after the drying process on the hot plate. The pigment would most likely remain «green», if it was dried on a sand bath or naturally.

485. For the colour of the solid, see «vivid yellow».

486. Therefore, the colour is slightly more orange than «lemon-yellow».

487. A second test (consisting of two samples: .50 g + 100 ml hydrochloric acid / soaking of two years) gave a liquid and a solid, which are both «orange», which, when dried, tend towards a still «more vivid sunny yellow».

488. The result is always essentially the same, no matter what is the duration of the soaking.

489. The small gold particles become more concentrated. The gold could be said to have come out of the surface of the rock. It seems more concentrated and the «gold» colour is more acute than it was before the irradiation.

1942

490. From 424.7 to 484.704 Mrad, the calibre, comparatively to the same mineral when it is irradiated, appears «honey», «beige» and dull.

491. The colour darkened considerably.

492. The brilliance diminishes at 5 and 10 Mrad, becomes «iridescent yellowish gold» and darker at 57.4 Mrad and the colour has not much brilliance at 148.4 Mrad.

493. The «yellow» is therefore more pale.

494. A mixture of «beige» and «green» gives a «yellow ochre» aspect.

495. The change occurs at 11.4 Mrad and the colour remains almost the same at the following irradiation dosages.

496. The «yellow ochre» differs from the colour obtained at 482,313 rad.

497. For the colour of zirconium oxide, irradiated with gamma rays, see «white (beige or grey tone)» and, irradiated with electrons, «almost pure white».

498. The «honey tint» is still lighter than the «smoky greyish tint», which was previously obtained.

499. Only the colour of the crystal points was modified. At 5, 10 and 57.4 Mrad, there is no change perceptible to the naked eye.

500. Only the colour of the crystal points was modified.

501. Progressively, between 148.7 and 287.3 Mrad, the change occurs for the entire crystal.

502. The main change occurs at this point. The entity of the crystals is «honey-yellow».

503. At 124.704 Mrad, there is no change perceptible to the naked eye.

504. From 5 to 604.53 Mrad, the translucence of the rock remains almost the same.

505. At 122.984 Mrad, there is no change perceptible to the naked eye.

506. It has the same orange colour as the fruit.

507. The galena forms an adherent and permanent glaze on the surface. Its colours are «orange-yellow» and «pinkish orange».

508. The soaking may be longer or the drying may be immediate.

It is then possible to obtain modalities of the «vivid yellow». In the present case, a vertical container was not used as it was the case when I produced superimposed layers of colours in a column formed container. The most important point in the present case is that the asbestos must be entirely covered with acid and dried progressively on the hot plate.

509. At 63.984 Mrad, there is no change perceptible to the naked eye.

510. Various intensities of «yellow», ranging from «vivid light yellow» to «vivid orange-yellow», are formed. It all depends on the thickness of the mass formed by the serandite and the acid. The phenomenon is similar to that of asbestos.

511. The semi-quantitative spectrographic analysis of this «vivid reddish orange» industrial pigment may be read as follows: %Elmt: .658 P K / .178 AlK / 98.482 CaK / .000 TiK / .705 CrK / .000 CoK for a total of 100.22. This pigment undergoes no change perceptible to the naked eye, when it is irradiated with gamma rays at 63.984 Mrad and at 122.984 Mrad.

512. For the colour of the layer at the surface, see «light orange» and, for the one resting at the bottom, «apple-green». As in the other cases of the transformation of asbestos by treating it with acid and heat, the conditions of this transformation may vary and allow to obtain modalities of the same colour, but the result remains mostly the same. The duration of the soaking of asbestos may vary or the drying may be immediate. It is also likely that, with the use of a higher vertical container, other colours or tones could be obtained. This transformation could also be done in controlled atmosphere.

513. It is possible to build a range of colours from a combination of stibnite and sulphur.

514. Mostly «greenish orange».

515. When the rock (block of fibres) is cut, we discover that the matter darkens mostly from 287.3 Mrad going up. At 615.924 Mrad, when we cut the rock, the interior appears to be «blackish brown» and the fibre at the surface is «golden orange».

516. For the colour of the layer in the middle, see «greenish orange»; for the layer at the bottom, see «apple-green». By varying the conditions of application of this test, we obtain different modalities of the same colour, but the result remains mostly the same. The time of soaking of asbestos may differ or, still, the drying may be immediate. It is also likely that, if I used a more elongated vertical container, other layers of colours would form. This transformation could also be done in controlled atmosphere.

517. The colour is less brown than with sulphur.

518. The colour is more brown than without sulphur.

1944

518a. For the colour of the solid, see «orange-beige».

519. «Vivid medium orange» [the colour of the fruit].

520. The colour is identical to the one of the fruit.

521. The colour is less orange than after five months of soaking.

522. It is possible that a predominance of sodium carbonate in the combination, heated up to 1900 °F, would give a «green».

523. The residual solid has three layers of colour: at the surface, «brown»; in the middle, «grey»; at the bottom, «orange». For the liquid, see «light brown».

524. A range of colours could be built by changing the duration of the heating and the temperature, starting from 0 °F and going up.

525. There is also a metalized piece of copper.

526. This note is annuled.

527. The colour is mostly brown.

528. The glaze is adherent with small green spots.

529. The glaze is adherent with yellow, green and brown spots.

530. Crystals with orange tones of various intensities.

531. The same «orange» as the halite irradiated at the same dosage, though less intense.

532. The sylvite, at the state of a rock, undergoes no change perceptible to the naked eye, when it is irradiated during 7 days, placed directly at the exit of the primary beam of a Philips X ray generator (copper radiation, 20 mA current, 40 kV voltage).

533. The colour is of the «caramel-orange» type.

534. The colour changes at 11.4 Mrad and remains identical at 17.91 and 22.8 Mrad.

535. At 190.22 Mrad, there is no change perceptible to the naked eye.

536. The «orange tone» is considerably darker and more accentuated.

537. At 242.804 Mrad, there is no change perceptible to the naked eye.

537a. For the colour of the solid, see «medium rusty orange».

538. At 70.4 Mrad, there is no change perceptible to the naked eye.

1945

539. For the colour of the liquid, see «light lemon-yellow».

540. The colour is lighter than the one, which results from the same test made in the same conditions, except that the quantity of sulphur varies (see «dark rusty orange»).

541. The ziconsium silicate, irradiated with electrons at 302,831 rad[36], passes from «white [light yellow reflection]» to «almost pure white». Irradiated with gamma rays at 360 Mrad, it becomes «white [light beige or grey reflection]».

542. Comparatively, the calibre appears «reddish orange» and, the sample irradiated at 244.53 Mrad, «orange [light brown tone]».

543. The colour darkens slowly until 360 Mrad is reached and considerably at 604.53 Mrad.

544. For the colour of the solid, see «orange-brown».

545. The colour is more vivid and brown than with hydrochloric acid.

546. The colour is «brick-orange» more pronounced than the colour of the sample heated at the previous temperature.

547. Shales (formation of Sillery), which come from the cliff of Québec city, the cliff of Cap Rouge and from Saint-Fabien-de-Panet, and naturally are of various tints of «mat pinkish chocolate-brown», are heated 0↑1400 °F and slowly cooled (15 h) in the furnace. When heated, these shales take on various tints of «orange» and «salmon (or pinkish orange)». A semi-quantitative spectrographic analysis of this shale, coming from Saint-Fabien-de-Panet, may be read as follows: %Elmt: 40.817 SiK / 14.535 K K / 33.448 FeK / 10.785 AlK / .000 CaK / .394 S K / .000 CrK for a total of 99.979. The analysis by X ray diffraction of the shale from Cap Rouge may be read as follows: major phases: quartz, feldspar / minor phase: haematite / phases in traces: chlorite, mica. The semi-quantitative spectrographic analysis may be read as follows: %Elmt: 10-50 Si / 2-10 Al,Fe / 1-5 K / 1/1-2 Mg / 0,1-1 Na,Ti / 0,05-0,5 P,Ca / 0,01-0,1 Mn,Zr,Ba / 0,005-0,05 B,Cr,Ni,Cu,Sr,ZnSb,Pb / 0,001-0,01 V,Co,Sn / <0,001 Be. A more precise semi-quantitative spectrographic analysis may be read as follows: %Elmt: 58.4 $SiO_2$ / 18.8 $Al_2O_3$ / 2.35 MgO / 0.40 CaO / 1.61 $Na_2O$ / 4.44 $K_2O$ / 0.94 $TiO_2$ / 0.05 MnO / 7.68 Fe t. in $Fe_2O_3$ / 0.04 C total / PPM 130 Zn.

548. The colour is darker than: 1) when asbestos is treated with hydrochloric acid uniquely; 2) when asbestos is irradiated at its natural state without having been submitted to any previous treatment.

549. With «accentuated olive-green» traces.

550. The «caramel» area of the glaze has a «red tone» and is isolated. Another part of the glaze is a thick layer of «grey» matter. In the area where the glaze is thin, the colour is «sunny orange-yellow».

1946

550a. During the irradiation with gamma rays, the glass paste progressively passed from transparency to opaqueness, without ever becoming completely opaque, even though the irradiation dosage is relatively high. At 5.7, 11.4, 91.29 and 96.15 Mrad, it conserves its transparency. At 107.55 Mrad, it becomes slightly more opaque; at 118.95 Mrad, still a bit more as well as at 124.65 Mrad.

551. The rock conserves the same translucence.

552. The colour is as «orange» as the fruit. The colour is more intense than the one obtained after having undergone the five successive stages. It is also slightly more amber.

553. The colour is more pale than the previous colours.

554. The colour is lighter than when the mineral is heated at 1500 °F during one hour.

555. The colour is slightly more pale than when the mineral is heated at 1650 °F.

556. At 5.7, 11.4 and 17.91 Mrad, there is no change perceptible to the naked eye.

557. The heat treatment could have been different. For example, we could deposit asbestos at a given temperature and maintain it at that temperature during a determined time. Furthermore, the temperature could have risen from 0↑1900 °F and maintained there during a certain time, instead of immediately removing the asbestos as soon as the temperature has been reached, as it is presently the case.

558. At 1000 °F and 1600 °F, the pigment has a golden reflection, when it is examined in natural lighting.

559. At 5 and 604.53 Mrad, the rock conserves more or less the same translucence.

560. This note is annuled.

561. The colour has no traces of «green».

562. A range of colours may be built by varying the process and the duration of the heat treatment, as well as the proportions of the components.

563. «Salmon»: In this case, the colour is «pinkish orange» and resembles «salmon» with, however, a predominance of the «orange» on the «pink».

564. The colour of the cement is «pinkish orange» or resembles the «medium salmon» type.

565. This note is annuled.

566. After two years of soaking, the liquid and the solid are «orange».

567. The permanent and adherent glaze is «pinkish orange» and «orange-yellow», while the mass of the cement is «light orange-pink».

568. A series of «orange-yellow» ochres and «orange» ochres of various intensities -- most likely clayey limonites --, which come mostly from an excavation site on Route du Vallon in Sainte-Foy, in the suburbs of Québec, are heated 0↑1400 °F and slowly cooled in the furnace (15 h). On the one hand, the «orange» ochres have darkened and become more accentuated. On the other hand, the «orange-yellow» ochres have become of «still a more orange-yellow». A mineralogical limonite of Saint-Urbain, Charlevoix county, which was originally «dark rust» became «chocolate-brown», when heated in the same conditions. The margin of the semi-quantitative spectrographic analysis of this mineralogical limonite may be read as follows: major phase: haematite / minor phase: quartz; 10-50% Fe; 2-10% Si; 0,1-1% As,Sn; 0,05-0,5% P,Mg,Cu,Zn,Sb,Pb; 0,01-0,1% Al,Ti,Mn; 0,005-0,5% Na,Ca,Bi; 0,001-0,01% B,Cr,Co,Ni,Zr,Mo,Ag. The semi-quantitative spectrographic analysis of this mineralogical limonite gave the following results: 13.3% $SiO_{1-2}$; 0.90% $Al_2O_3$; 0.14% MgO; 0.10% CaO; 0.09 $Na_2O$; 0.30% $K_2O$; 0.21% $TiO_2$; 0.05% MnO; 79.6% Fe t. in $Fe_2O_3$; 0.05% C total; 790 PPM Zn.

569. After two years of soaking, the liquid and the solid are «orange».

570. This note is annuled.

571. At 302,831 rad, there is no change perceptible to the naked eye.

572. At 5 and 604.53 Mrad, the rock becomes progressively more translucent.

573. Minerals, similar to the mineral coming from the same copper and nickel site, located 3 km West of Saint-Fabien-de-Panet, were heated 0↑1400 °F and slowly cooled (15 h) off in the furnace. Here is the margin of the semi-quantitative spectrographic analysis of one of them: %Elmt: major phase: mica / secondary phase: quartz; 10-50 Si; 2-10 Al,K; 1-5 Mg; 1/2-2 Fe; 0,1-1 Na; 0,05-0,5 P,Ti,Cr,Ba; 0,01-0,1 Ni,Zn,Zr; 0,005-0,05 Mn,Co,Sb; 0,001-0,01 B,Cu,Pb; <0,001 Be,Sn,Mo,Sn. A semi-quantitative spectrographic analysis gave the following results: %Elmt: 56.4 $SiO_2$, 20.3 $Al_2O_3$, 2.77 MgO, 0,05 CaO, 0,33 $Na_2O$, 7,80 $K_2O$, 0,77 $TiO_1$, 0,01 MnO, 5,45 Fe t. in $Fe_2O_3$, 0,09 C total. Originally, all of them were of a more or less yellowish «cream», ranging from light to dark; each of them is composed of various proportions of quartz and mica. When heated, they all become «orange-pink ochre» ranging from light to dark.

574. The colour is between «brown» and «salmon». It results from the two changes of colour undergone by the bauxite in the glass stem after its irradiation. The ends of this glass stem were blocked with paste. The bauxite near the paste became «brown» after irradiation, while the one at the center of the stem became «dark salmon» after the irradiation.

1948

575. At this stage, the colour is so weak that it is difficult to determine precisely its characteristics.

576. The biggest particles. The smallest particles are «light yellow».

577. The smallest particles are «lilac-pink» and, the biggest, «blue».

578. During the drying attempt, a white solid gradually formed itself at the bottom of the liquid.

579. After one week of soaking, the liquid is «greenish turquoise». This colour disappears when heated for the drying.

580. The rock maintains the same translucence that it naturally had.

581. After two years of soaking, the liquid is a «very strong pink».

582. For the colour of the solid, see «pink».

583. For the colour of the 1st liquid, see «pinkish beige».

584. A layer of «pink» powder on a layer of «black» matter.

585. This is the threshold point, where the change begins. 1600 °F and 1700 °F are the temperatures at which the change occurs the most significantly or strongly.

586. A layer of «pink» matter covers a thick layer of «blue-grey» matter.

587. Covered by a «pale apple-green» layer of powder.

588. The colour is at the state of a tone from 5 to 102.4 Mrad inclusively.

589. The drying of the 2nd liquid remains incomplete, when it is heated on the hot plate. The drying will be complete according to conventional methods. Furthermore, the «violet» liquid and the «lees wine coloured-pink» paste would be possibly conserved if these methods were directly applied to them.

590. The rock conserves the same translucence.

591. There are three sizes of particles: the biggest: «light pink»; the medium size: «greyish beige»; the smallest: «white».

592. There is no orange area.

593. For the colour of the liquid, see «violet-pink».

594. With the aid of a spectrofluorimeter, having a xenon lamp of 1,000 watts and a CS-7-59 #5850 filter, we observe that this mineral, which was not fluorescent at its natural state, becomes fluorescent after having been treated with phosphoric acid. When exposed to a 270 nanometer excitation wavelength, we observe that the fluorescence is located between 330 and 370 nanometers; at 250, between 260 and 280 and between 330 and 360; at 290, between 350 and 390. The calcite, which is naturally fluorescent, has a 250 nanometers excitation wavelength, a fluorescence which is located between 340 and 350 nanometers; at 270, a fluorescence of 350; at 280, 290 and 310, a fluorescence of 370 nanometers (however, we observe that the fluorescence intensity is weak). It must be noted that the phosphoric acid alone is not fluorescent. Such pigments are therefore fluorescent when exposed to a UV lamp.

595. This «candy pink» pigment was exposed to the 1,000 watts xenon lamp of a spectrofluorimeter by using two filters, the 3-73, which allows the passage of the visible only by excluding the UV, and the CS-7-59 #5850, which allows the passage of the UV only. A) With the UV filter: At the 270 nanometers excitation wavelength, we observe that the fluorescence is located between 330 and 370 nanometers. When the excitation is at 250 nanometers, there is a fluorescence between 260 and 280 nanometers and between 330 and 260 nanometers. When the excitation is at 290 nanometers, the fluorescence is located between 350 and 390 nanometers. B) With the 3-73 filter: At the 400 nanometers excitation wavelength, we observe that the fluorescence is between 370 and 420 nanometers; at 420, between 390 and 450; 440, between 410 and 470; 460, between 420 and 495; 480, between 440 and 500; and 500, between 470 and 520. Let us compare with the calcite (247) from Bancroft in Ontario, which is naturally fluorescent. A) With the UV filter, when there is a 420 nanometers excitation, the fluorescence is between 428 and 440; at 430 nanometers, between 420 and 450; at 450, between 450 and 475; at 500, between 470 and 530. B) With the 3-73 filter, when the excitation is at 250 nanometers, the fluorescence is between 340 and 350 nanometers; 270, at 350 nanometers; 280, at 370; 290, at 370; 310, at 370 nanometers which is the maximum wavelength. The fluorescence of the calcite, which was studied with the UV filter, is «mauve». Two other pigments were observed in the same manner: olivine (92), treated with phosphoric acid, which gave a «candy white» having the texture of coarse salt, and zinc (319), also treated with phosphoric acid, which gave a «greyish white» also having the texture of coarse salt. Now, neither phosphoric acid, nor goethite, nor olivine or zinc, at their natural state, are fluorescent. The minerals become fluorescent after the treatment with phosphoric acid and, once they have been soaked in ammonia, they lose the fluorescence they had acquired.

596. Up to this point, the mineral is only tinted. From 201.6 Mrad, we can designate the mineral as being «coloured» as such.

597. The spectrofluorescence X analysis of this «grey» pigment may be read as follows: %Elmt: 5.246 MgK / 5.891 SiK / 3.505 S K / 12.353 CaK / 21.348 FeK / 26.191 CoK / 25.468 AsL for a total of 100.002.

598. The spectrofluorescence X analysis of the solid may be read as follows: %Elmt: 87.02 AsK / .000 PbM / .10 SiK / 1.32 S K / 2.57 CaK / 2.38 FeK / 6.68 CoK for a total of 100.00.

599. Many series of colours could be built with this mineralogical combination, which could be treated: a) with hydrochloric acid, b) nitric acid, c) with a mixture of both acids, d) by heating them at various temperatures either for a determined time, either by starting from the ambient temperature and rising to a definite temperature and maintaining the heat or not at this chosen temperature.

600. After two years of soaking, the «reddish violet» liquid becomes «crimson-violet» and tends towards «dark violet-brown».

601. The spectrofluorescence X analysis of the «old rose» gave this result: %Elmt: 24.10 AsK / .000 PbM / .000 SiK / 27.00 S K / 0.63 CaK / 9.74 FeK / 38.34 CoK for a total of 100.00.

602. The vesuvianite, at the state of a rock, undergoes no change perceptible to the naked eye, when it is irradiated with electrons at 164,800 rad.

603. Almost all the pigments, treated with phosphoric acid, remain humid after the drying attempt on a hot plate, which lasts from one week to one month. Generally, the reaction is the same. The pigment in the phosphoric acid becomes progressively viscous and then has the texture of coarse salt or a pastel coloured candy. Four drying techniques, each composed of four tests, were experimented. The «candy pink» pigment sample was deposited in a 5 or 6 cc test tube. First technique: 1/4 g of pigment is diluted in a NaCl and $H_2O$ concentration, according to various proportions, and dried naturally in ambient air. We do not obtain a favourable reaction. Second technique: 1/4 g of pigment is diluted in a NaOH and $H_2O$ concentration, according to various proportions, and dried naturally in ambient air. The entity does not dry or dries more or less, because the concentration is too strong. Third technique: 1/4 g of pigment is diluted in a NaOH and $H_2O$ concentration, according to various proportions, and dried naturally in ambient air. In this case, the reaction is too violent and the colour is modified. The fifth technique is the most favourable: 1/4 g of pigment is diluted in a a) NaOH and b) $H_2O$ concentration according to the following proportions: a) 1% - b) 99%; a) 2% - b) 98%; a) 4% - b) 96%; a) 8% - b) 92%; a) 16% - 84%. We bring the content of each tube to the boiling point on a bunsen burner and keep it there during a few seconds; this is equivalent to 100 °F. The aim is to trigger off a violent reaction. This way, we may be assured that <u>all</u> of the matter is brought to react. We obtain a powder, which is a «slightly lighter pink».

604. The «reddish violet» liquid has been irradiated with X rays by using a Philips therapeutic apparatus, usually used for medical purposes, during 4 hours with 448 «shots» [1 shot at an interval of every 30 seconds and lasting 1/10 second] at 100 milliamper and 70 kV, at a distance of 40 inches from the sample, without obtaining a change perceptible to the naked eye.

605. For the colour of the liquid, see «red».

606. Burgundy, because it is in the same categoryas «Burgundy red».

1951

606a. We obtained two different results, though they are similar (4420 and 4223), in the same conditions.

607. The «indian red» differs from the one which was obtained during the first heat treatment from 0↑1400 °F. The present test is the first of a series of tests made with sulphur (see «brown»).

608. When looked at through a magnifying glass, the samples, irradiated at 5.7 and 64.7 Mrad, appear to be more red than the calibre. Simultaneously, the sample, irradiated at 64.7 Mrad, seems to be more red than the one irradiated at 5.7 Mrad.

609. The change occurs slowly and is minimal at each step. The sample, irradiated at 424.7 Mrad, is the most revealing. However, the change is not as remarkable as the one obtained with the goethite which was not previously heated. Since this pigment has been heated, it is most likely more stable.

610. A series of minerals, from the same place at Red Mill, ranging from various tints of «rusty orange» to «reddish brown», were heated from 0↑1400 °F and were slowly cooled off (15 h) in the furnace. They all gave various tones of «caput-mortuum» and «indian red». It is the same case for the pigments refered to at notes 111 and 128. Let us add the margin of the semi-quantitative spectrographic analysis done by X ray diffraction of another one of those minerals coming from Red Mill: Major phase: goethite; 10-50% Fe; 0,05-0,5% P,Si,Ca,Mn; 0,01-0,1% Zn; 0,005-0,05% Na,Ti,Co; 0,001-0,01% Mg,Al,Zr; <0,001% Cr,Ni,Cu,Pb. The semi-quantitative spectrographic analysis may be read as follows: Dosage %: 1.00 $SiO_2$ / 0.20 $Al_2O_3$ / 0.05 MgO / 0.82 CaO / 0.09 $Na_2O$ / 0.07 $K_2O$ / <0.10 $TiO_2$ / 0.08 MnO / 64.4 Fe t. in $Fe_2O_3$ / 9.72 C total / 640 Zn PPM.

611. The analysis by spectrofluorescence of the «lees wine coloured red» pigment reveals this: %Elmt: 33.47 AsK / 0.65 PbM / 0.08 SiK / 0.34 S K / 4.69 CaK / 7.17 FeK / 53.21 CoK for a total of 100.00.

612. At 195.92 Mrad, there is no change perceptible to the naked eye.

613. The colour resembles that of the red shale (formation of Sillery).

613a. The colour differs from the «dark and pronounced Burgundy red», obtained by heating crocidolite from 0↑1900 °F.

614. The colour differs from the previous one.

615. The colour is the same at 17.91 and 22.8 Mrad.

616. The «reds» and «brownish reds» all differ one from the other, depending on the proportions of the components and this may be applied to all of the modifications which follow.

617. With a «black» layer of matter on the surface. After two years of soaking, the liquid is «brown»; after four years, «reddish orange». For the colour of the solid, see «reddish brown».

1952

617a. The «dark brownish red» is less brown, when the crocidolite is heated with sulphur at the same temperature during the same time.

618. Transparent. The colour is in fact at the state of a tint, wich may be associated with the colour of a sheet of mica.

619. The change is more evident for the biggest particles rather than the smallest.

620. With «dark iron-grey» particles.

621. With «medium iron-grey» particles.

622. For the colour of the 2nd liquid, see «pink».

623. From 1000 °F on, the mineral becomes progressively opaque.

624. The liquid and the solid are not separated after the soaking.

625. «Pinkish Beige [with green spots]» in certain areas. By observing a similar test, which soaking time is two weeks («greenish yellow»), we may conclude that this pigment should have been «greenish yellow» or «green» and that it was burned because it was heated for too long. After two years of soaking, the liquid is «light yellow» and, the solid, «medium chocolate-brown».

626. To obtain variations of colour with asbestos, it is possible to combine it with another or other mineral(s), with which it is compatible, to grind them together, to heat them before and/or after their combination and to vary their respective proportions.

627. These particles are generally darker than the original «bluish green».

628. The mineral melts partially to form a «caramel-brown» glaze; the remaining part of the mineral is a «pinkish beige» powder. It is the same case at 1800 °F.

629. For the calibre, the orange aspect of the «orange-pink tone» predominates on the pinkish aspect. On the other hand, for the irradiated mineral, the pinkish aspect predominates on the orange aspect.

630. This «orange-pink tone» give it luminosity.

631. There is no trace of «blue», as it was previously obtained. This means that the «violet-blue» occurs at a precise dosage, when the mineral is being irradiated. After this dosage, the barite, which was previously heated, becomes brown.

632. The colour is a bit more accentuated than before.

633. This note is annuled.

634. At this point, the colour is still not clearly determined.

1953

635. The tone is «olive-green».

636. The «green» tone is less pronounced than that of the mineral heated at 1400 °F during one hour.

637. At 254.204 Mrad, there is no change perceptible to the naked eye.

638. Other conditions could be applied in this case: 1) The heating conditions could vary. The mineral could have been previously heated at any temperature, ranging from ambient air to a high temperature, a) and immediately removed as soon as the chosen temperature is reached, or b) maintained at the chosen temperature once it has been reached. The mineral could also be immediately deposited at a given temperature for a variety of time. 2) The conditions of the treatment with hydrochloric acid could also vary. The mineral could be soaked a) in various quantities of acid b) during various periods of time. 3) The proportions of the two components, asbestos and sulphur, could vary, resulting in various colours or tones.

639. The colour, obtained in this case, «chamois-beige», is different from the colour obtained by heating asbestos at its natural state. This commentary may be applied to all the «beiges» obtained with this same mineral from Asbestos.

640. It would be possible to use the same mineral, which would have been heated at 1900 °F, 2) treated with hydrochloric acid and 3) heat it anew 4) and, finally, combine the result with sulphur and heat this combination.

641. In the case of the present combination of asbestos and sodium carbonate, there is no reaction between asbestos and carbonate, when they are heated together, because they were not properly grinded. The carbonate powder slides easily on the fibres, as it is the case for crocidolite, instead of clinging to them. See «green» for the successful results.

642. The colour became more pale and lost its «orange tone».

643. The colour is mostly pinkish rather than orange.

644. For the colour of the 1st liquid, see «cream»; of the 2nd liquid, see «light greyish beige»; of the solid, see «greyish beige».

645. The colour is a «yellowish beige» more intense than was the colour of the rock irradiated at 604.53 Mrad.

1954

645a.

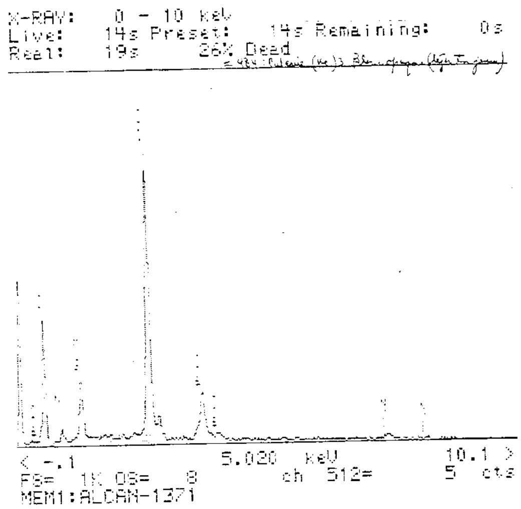

646. Blurred translucence.

647. The colour is «beige» lighter than the colour of the rock irradiated only at 360 Mrad. However, this last one also has a «honey» tone.

648. The colour is more accentuated and has become more dark.

649. At 11.4, 17.91 and 22.8 Mrad, the colour is identical.

650. The «light orange-beige» colour is therefore more intense.

651. The colour is lighter than the colour of the calibre.

652. The colour is less dark than at 1000 °F and more dark than at 1300 °F. The «orange-beige» is darker than the previous colour, which was «orange-beige lighter than "orange-beige"».

653. In this case, the asbestos is grinded with the sodium carbonate; both are not heated together, but are put directly in the acid. After the soaking, they are dried on a sand bath.

653a. For the colour of the liquid, see «orange».

654. For the colour of the steatite, see «grey».

655. The «orange tone» is equivalent to the tone of the «orange» area of the sample irradiated at 57.4 Mrad.

656. The colour is more luminous than the «dark creamy beige».

1955

657. The colour is an «orange-beige» which differs from the one obtained when the tremolite is heated from 0↑1900 °F.

658. For the colour of the liquid, see «greenish turquoise» and «olive-green».

659. The «white (grey reflection)» orthoclase, heated at 1600 °F during an hour without being wrapped in dough and irradiated at 424.7 Mrad, is less dark and opaque than this one.

660. The «beige» is darker, more brown.

661. This note is annuled.

662. The mixture of the components may range from the «reddish orange-beige» to the «reddish orange», the «red», the «indian red», etc., depending on the proportions of the components and the temperature. This mineral is very compatible with goethite. A white or black component could be added to establish various tones of the same colour.

663. There is a slow progression at each step.

664. The colour is more acute, more accentuated and a bit more brown, but without being darker.

665. The mineral has the appearance of a tarnished film. The change is minor.

666. The mineral is transparent with an «accentuated beige reflection».

667. With a few «green» particles.

668. At 22.8 Mrad, the «beige» is identical to the beige obtained at 17.91 Mrad.

669. At 254.204 Mrad, there is no change perceptible to the naked eye.

670. Glass bottles, made with bore silicate, take on «amber» tones of various intensities, when they are irradiated with gamma rays from .01 Mrad going up. They range from «light amber» to «dark amber». This could be compared to the evolution of the glass paste and the glass powder, irradiated with gamma rays.

671. A crust, which is «black» in appearance, is formed with a «light royal-blue» deposit on the porcelain. This «royal-blue» is a glaze, which changes when it is irradiated with gamma rays. This proves that the colour of a glaze can be changed with irradiation. When irradiated, the «black» crust becomes «very light beige»; the «royal-blue» glaze becomes «lapis lazuli-blue».

672. With a few «brown» particles.

673. The rock is slightly opaque.

674. There is no change perceptible to the naked eye, when this mineral is irradiated at the state of powder during 2,000 seconds at $10^{12}$ neutrons / $cm^2$ / second and, afterwards, soaked in the Kodak D19 photographic developer.

675. One side of the rock is «white», without having any «pink reflection»; the other side, that is the base of the rock which was immediately in contact with the source of heat, became «light beige».

676. We note that the mineral has become more dark when it is compared with the calibre.

677. The «light beige» of the titanium dioxides #2020, #2101, #2101-1 and #2073 are equivalent to the one obtained at 424.7 Mrad.

677a. The rock has two different colours distributed in two areas.

678. Among all of the irradiated titanium dioxides, the #1000 is the one whose «beige» colour is the most pronounced.

679. Among all of the irradiated titanium dioxides, the #2071 and #Tx-2071-4 are the ones whose beiges are the lightest. However, the gap is thin.

680. At this point, the colour could be designated as being a «pale yellow» similar to the colour of the fluorine, which is naturally yellow.

681. The mineral did not undergo any change perceptible to the naked eye, when it was irradiated with gamma rays at 124.704 Mrad.

682. The colour is a «more intense beige».

683. After two years of soaking, the liquid is «colourless» and, the solid, «light beige».

684. At 22.8 Mrad, the «beige» is identical to the one obtained at 17.91 Mrad.

685. The smallest particles are «dark beige»; the biggest, «dark crimson-grey».

686. The «grey» particles become «beige», while the «blues» become «dark blue [indigo-blue type]».

687. This note is annuled.

688. At 201.6 Mrad, the rock is entirely «orange».

689. The rock, irradiated at 360 Mrad, is totally «orange».

690. With a few «pinkish» particles.

691. After the soaking, the liquid becomes «accentuated apple-green» and, the solid, «light green». When distributed in eight watch glasses to let the pigment dry, the liquid progressively becomes «beige» and, the solid, «light yellow (light green tone)».

692. All the particles are «beige».

693. The colour is therefore considerably more pale. The «orange tone», which gave a copper reflection to the pigment, is considerably diminished, without having completely vanished.

694. The colour maintains a «very light orange reflection».

695. The changes of the natural anorthosite, obtained with irradiation, are important, because they influence the resulting colour, when the irradiated anorthosite is afterwards mixed with sodium or potassium carbonate and heated.

696. The smallest particles are «dark beige»; the biggest, «dark crimson-grey».

697. Some particles have an «orange tone».

698. The smallest particles are «white (very light localized green reflection)»; the slightly bigger particles, «light beige».

699. This is the threshold point of the modification.

700. The «beige-green» is more accentuated than the colour of the calibre.

701. Three sizes of particles were irradiated: the smallest (see «white): the medium; the biggest (see «pink»).

702. The medium particles. There are three sizes of particles: the biggest become «light pink»; the medium: «greyish beige»; the smallest: «white».

703. The colour has lost the «orange tone» of the calibre.

704. The colour therefore became darker and more brown.

705. The piece is bursted.

706. When soaked in the Kodak D19 developer after irradiation, the mineral, irradiated with neutrons, does not undergo any change perceptible to the naked eye.

707. After two years of soaking, the liquid is «colourless» and, the solid, «white».

708. The cement is friable.

708a. At 5.7, 11.4 and 17.91 Mrad, there is no change perceptible to the naked eye.

709. Concerning the layer in the middle, composed of liquid and matter, see «brownish beige». The residual solid is at «greyish beige». For the 1st liquid, see «cream».

710. At the state of a light tone. A hole is made in the yellow fluorine, when it is irradiated with a UV laser beam during 60 minutes on a 0.01 $cm^2$ surface with a laser energy of 0.180 Joule having a flux of 6.0 x $10^8$ W / $cm^2$ which gives a total energy of 13,000 Joules. The same goes when it is irradiated during 0.5 minutes on a 0.0025 $cm^2$ surface with a laser energy of 0.210 Joule having a flux of 2.8 x $10^9$ W / $cm^2$ which gives a total energy of 126 Joules.

711. With «dark grey» particles.

712. The colour is more dark and brown.

713. For the 1st liquid, see «cream». For the layer in the middle, composed of a liquid and a solid, see «brownish beige»; the 2nd liquid, «light greyish beige». With «yellow» particles.

714. This «beige» is slightly darker than the previous «chamois-beige», because it acquires a «grey tone». It is in the same family as the sample irradiated at 287.3 Mrad.

714a. The liquid and the solid were not separated before the drying on the hot plate.

715. With crystals, which have the colour of aluminium.

716. The colour is identical to the one obtained at 11.4 and 17.91 Mrad.

717. The smallest particules are «greyish beige» and, the biggest, «lilac».

718. The colour is considerably more dark and brown.

719. The colour is much more intense than the colour of the previous sample.

720. Therefore, firstly, the «beige» is more pale and it becomes less orange; secondly, it darkens, becomes «greyish» and conserves only a reflection of the original «orange tone».

721. Three sizes of particles were irradiated: the smallest (see «white»); the medium; the biggest (see «pink»). Irradiated at 424.7 Mrad, the particles of all sizes uniformly become «medium greyish beige (light orange tone)».

722. After the irradiation, the «beige» changed. While the calibre is more pinkish than beige, the «beige» of the irradiated sample is more brownish than pinkish and it has a «grey tone and a pinkish orange reflection».

723. The colour is darker than that of the following sample.

1959

724. Having lost the orange tone of the calibre, the colour has become more mat and less luminous.

725. Progressively, the colour also loses its «green tone».

726. Therefore, the «orange» is darker in relationship to the «beige-orange».

727. At 424.7 Mrad, the colour is more dark and brown, without however being able to designate it as being «dark». It conserves a bit of the original «orange» tone. Consequently, the colour is darker and more luminous.

728. The «orange tone» is much less vivid. Consequently, the pigment is darker.

729. The colour is less coppery than the colour of the sample at the previous step.

730. The conditions could have varied, at the level of the duration of the heat treatment as well as the temperature.

731. The colour is identical to the one obtained at 242.804 Mrad.

732. The colour becomes slightly more accentuated as the quantity of zirconium oxide increases.

733. The colour is still slightly more accentuated.

734. The colour is darker than the colour of the calibre.

735. We are examining the evolution of the colour of the crystallin granules, while the evolution of the mineral was examined at «grey».

736. For the colour «caput-mortuum» see the Talens - Rembrandt pastel chart at the serial number 343, enclosed after Table I.

737. The colour is darker than the colour of the previous sample.

738. The calibre is more brown.

739. A combination, where the sodium carbonate would predominate, would most likely give an «olive-green».

740. If the sodium carbonate predominated in the combination, it would probably give (considering the other tests which I have made) a «green» at this point, which would become more accentuated and would modify itself at high temperature.

741. The colour gives the impression of being «olive-green» and having a brown predominance.

742. The colour is the same at 17.91 and 22.8 Mrad.

743. For the colour of the liquid, see «medium chocolate-brown».

1960

744. The glaze has two areas: one, brilliant and thick, is «orange-brown», «dark green» and «iron-grey»; the other, thin and mat, is «yellow» and «orange».

745. There is no perceptible change to the naked eye, when the mineral is irradiated with electrons at 150,082 rad.

746. There is a thick layer of «orange-brown» matter at the surface of the rock. The second layer of matter, ranging from the surface to the center of the rock, is «greenish grey». The center of the rock is «dark grey».

747. The «orange tone» is still lighter than the colour, which results from the combination (2 g + 2 g of sulphur), heated at 1600 °F during 1 hour.

748. The colour seems to have become slightly more pale because it tends mostly towards «orange-brown», while having the same intensity than the «reddish brown».

749. With «grey» particles.

750. The colour of the liquid is a «brown» more orange and lighter than the colour of the solid.

751. This note is annuled.

752. The «medium orange-brown» is slightly lighter than the one obtained when the same mineral is heated at its natural state from 0↑1000 °F.

754.

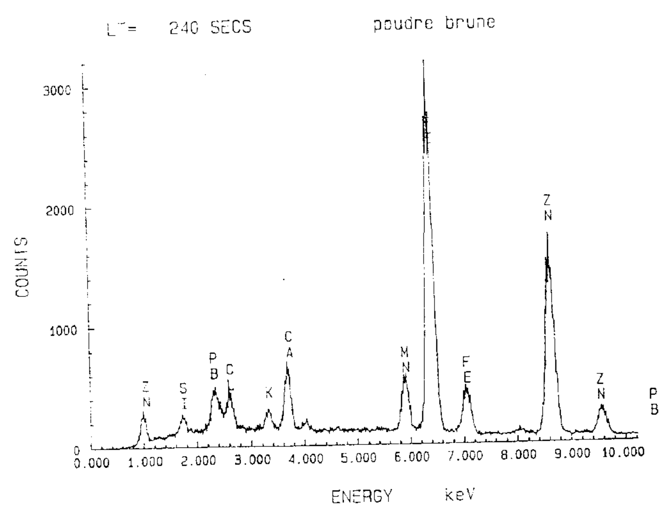

753. For the colour «mars-violet», see the Talens - Rembrandt pastel chart at the serial number 538.

755. At the moment of the deposit in the phosphoric acid, the mineral starts bubbling more violently than did the cement[82] (621) in the same conditions. The mineral then takes on the consistency of a cement. After two weeks of soaking, there is no significant change.

756. For the colour of the liquid, see «very light brown».

757. The «reddish orange-beige» mineral, inserted in a thin glass tube, which is blocked at the two extremities with a paste, is divided in two colours after this first dosage of irradiation: «light chamois-orange» at the center and «medium orange-brown» at the extremities of the tube, near the paste.

758. The threshold point, where the «metallic grey» passes to the «orange-brown», is located at 1550 °F. At 1400 °F and 1500 °F, the grinded mineral melts and the particles are welded, forming a «grey» glaze. The thickest area is «orange-brown» and «greenish brown»; the thinnest area is mat, «yellow» and «orange».

759. Commentaries: 1) The aspect of the colour varies according to the quantity of galena and the size of the particles after the grinding. 2) The grinding of the galena influences the temperature at which the galena melts. 3) Variations are brought to the galena by adding to it other minerals or products. 4) The heat process was carried out in a furnace. However, the mineral could be heated by a laser beam, which would sweep the surface of the mineral. 5) The heat treatment could be done in two ways: a) by putting the sample in ambient air and rising the temperature to a determined point; the removal may be immediate or the heating may last for a chosen period of time; b) the mineral may be put in the furnace immediately at the chosen temperature, for a determined period of time.

760. At 22.8 Mrad, the mineral keeps the same colour it has at 17.91 Mrad.

761. At 17.91 Mrad, there is no change perceptible to the naked eye.

762. The colours, obtained by combining the ochre and NaCl, are more vivid than the colours resulting from those obtained by heating the ochre in its natural state, in the same conditions.

763. The colour became just a bit darker and more brown.

764. This note is annuled.

765. The colour is less golden.

766. «Caramel-brown» is the colour of the Scottish caramel candy.

767. The colour is darker than the one obtained at 10 Mrad.

1962

768. The «green tone» dimishes progressively from 10 Mrad to 287.3 Mrad.

769. The adherent glaze, which is 3 millimeters thick, is «brown». A thin layer, which is located just besides it, is «light beige (greenish yellow)».

770. From 1600 °F to 1700 °F, the glaze progressively loses its opaqueness. It becomes translucid at 1800 °F and 1900 °F.

771. The glaze is adherent. There is also a layer of «greenish yellow» matter.

772. The glaze is adherent. The thick area of the glaze is «greenish yellow» and opaque; the thin area, «sunny yellow». From 1300 °F to 1900 °F, the two components remain separated. However, the presence of sodium carbonate modified the colour of the galena. Generally, the galena, located under the carbonate, forms a «yellow» glaze. Isolated from the carbonate, it is in the «caramel» and «brown» tones.

773. The cement must be broken in a bronze mortar.

774. The object of the observation will only be the crystalline part of the rock, since the molybdenite has already been examined at «grey».

775. Loses part of the «caramel tone».

776. For the colour of the solid, see «dark iron-grey».

777. The colour is equivalent to the one obtained with the same mineral, previously treated with ether.

778. The colour is more intense and uniform than the colour of the natural rock irradiated at 242.804 Mrad.

779. The rock has become more opaque.

780. The opaqueness and intensity of the «amber-brown» varies, depending on whether the rock is thicker or thinner (more orange). It has, at its surface, «whitish» areas and «indigo-blue» particles (which sometimes have a green reflection). The «blue» particles are opaque.

781. The glaze is «orange-yellow amber» in the area where the layer is 3 millimeters thick. In the areas where the layer is very thin, the glaze is «dark yolk-yellow».

782. The colour is equivalent to the colour obtained when the mineral was previously treated with ammonia.

783. The more the heat is high, the more the colour, resulting from the galena and sulphur combination, becomes more light and tends towards the «yellow».

784. There is no change perceptible to the naked eye when, at the state of powder, it is irradiated with neutrons during 2,000 seconds at $10^{12}$ neutrons / $cm^2$ / second and, also, when the powder is soaked afterwards in the D19 Kodak developer.

785. The present test can be done according to other conditions: 1) the duration of the heating may be shortened or prolonged; 2) the heating treatment could start at ambient temperature and rise to the determined temperature with a) an immediate removal of the hot pigment or b) a prolonged heating; 3) the proportions of the components may vary.

786. See note 785.

787. For the smallest particles. The biggest particles are a «more accentuated green».

788. At this point, the powder is more luminous than at the origin, possibly because it became more opaque.

789. The colour became considerably more dark at this point.

789a. The «burnt umber» resembles closely the one appearing in the Talens - Rembrandt pastel chart at the serial number 409PR101/PBr7.

790. This note is annuled.

791. The smallest particles. The biggest particles change to «light grass-green».

792. The colour is located between «brown» and «salmon».

793. At 17.91 Mrad, there is no change perceptible to the naked eye.

794. A series of yellow ochres of various tints, ranging from «light» to «dark», were heated from 0↑1400 °F and slowly cooled in the furnace (15 h). Two results were obtained: various tints of a) orange-yellow ochre and b) burnt Sienna. They come from ochreous deposits, consisting in various proportions of ferric oxide and silica, located at the «Jardins du Vallon» and the Belmont Cemetery at Sainte-Foy, in the suburbs of Québec city. The margin, obtained through the semi-quantitative spectrographic analysis of a yellow ochre from the Belmont Cemetery, gave these results: major phases: quartz, goethite; secondary phase: talc; phases in traces: feldspar; 10-50% Si; 5-20% Fe; 1-5% Mg,Al,K; 0.05-0.5% Na,Ti,Ca,Cr,Mn,Ni; 0.01-0.1% P,Zn,As; 0.005-0.05% Co,Zr; 0.001-0.01% B,Cu,Sb,Pb,W; <0.001% Mo. A semi-quantitative spectrographic analysis of the same mineral gave these %: 39.4 $SiO_2$; 8.50 $Al_2O_3$; 8.54 MgO; 0.32 CaO; 0.40 $Na_2O$; 1.72 $K_2O$; 0.42 $TiO_2$; 0.20 MnO; 26.0 Fe t. in $Fe_2O_3$; 1.26 C total; 340 Zn PPM. The margin, obtained through the semi-quantitative spectrographic analysis by X ray diffraction of another yellow ochre from the same place may be read as follows: major phase: quartz; minor phase: feldspar; phases in traces: talc, chlorite; possible phase, though uncertain: greenalite; 10-50% Si; 2-10% Fe; 1-5% Mg,Al; 0.1-1% Na,P,Ca; 0.05-0.5% Ti,Cr,Mn,Ni,Ba; 0.01-0.1% Zr; 0.005-0.05% B,Zn,As,Sr,Sb; 0.001-0.01 % Co,Cu,Pb,W; <0.001% Be. The semi-quantitative spectrographic analysis of this last mineral may be read as follows: Dosage %: 61.2 $SiO_2$; 9.00 $Al_2O_3$; 1.71 MgO; 0.87 CaO; 0.94 $Na_2O$; 1.92 $K_2O$; 0.52 $TiO_2$; 0.28 MnO; 13.2 Fe t. in $Fe_2O_3$; 0.96 C total; 200 Zn PPM. All of the «chamois-beige (light yellow tone)» ochres from the same place adopted «salmon» tints, while the various «burnt umbers», ranging from «dark» to «light», became «burnt Sienna». In the same conditions, various tones of «natural umber», ranging from «dark» to «light», adopted various tones of «burnt Sienna». «Light brown (light orange tone)» ochres adopted «wine-red» tones. «Coffee-brown» or «light chocolate-brown» ochres became «salmon». The margin, obtained by a semi-quantitative spectrographic analysis done by X rays, of one of these brown ochres gave the following results: major phases: quartz, goethite, talc; minor phase: chlorite; 10-50% Si; 5-20% Fe; 2-10% Mg; 1-5% Al,K; 0.1-1% Cr,Mn,Ni,As; 0.05-0.5% Na,P; 0.01-0.1% Ti,Ca,Co,Zn; 0.005-0.05% Zr,Sb; 0.001-0.01% B,Cu,Pb; <0.001% Be. The semi-quantitative spectrographic analysis gave the following results. Dosage %: $SiO_2$ 49.6; $Al_2O_3$ 5.30; MgO 8.80; 1.41 CaO; 0.32 $Na_2O$; 0.52 $K_2O$; 0.25 $TiO_2$; 0.45 MnO; 21.5 Fe t. in $Fe_2O_3$; 1.64 C total; 525 PPM Zn.

795. The colour is slightly different from those of the previous temperatures (at 400 °F - 500 °F).

796. The colour becomes more and more light as the quantity of zirconium silicate increases.

797. The «reddish brown» is more brown than the «brown (violet-red tone)», previously obtained at 1800 °F.

798. The colour is slightly more accentuated than the one obtained when the combination, comprising .50 g of zirconium oxide, is heated from 0↑1800 °F. The resulting «reddish brown» is more brown than the «reddish brown (violet tone)» previously obtained.

799. The colour is slightly more accentuated than the one obtained with the combination comprising 1 g of zirconium silicate. The resulting «reddish brown» is more brown than the «reddish brown (violet tone)» previously obtained.

800. The evolution of the colour is the same for the powder and the rock. However, there is a considerable difference of intensity between the two of them. The colour of the powder is much darker and much more intense.

801. For the «dark grey» areas, see «black». When irradiated with gamma rays at 482.984 Mrad, the «dark grey» areas become «brownish black»; the «orange-red» areas, «reddish brown».

802. The colour is considerably more vivid than the one of the calibre.

803. The golden metallic reflection has disappeared.

1965

804. At 5 and 102.4 Mrad, the «brown» has not changed. At 5 Mrad, the metallic particles have become a «whiter silver»; at 57.4 Mrad, «golden yellow»; at 102.4 Mrad, «dark old bronze». From 148.4 Mrad, the particles rarefy.

805. Almost all of the particles have disappeared.

806. The colour is darker than the one resulting from the combination (1 g + 1 g of nickel), heated at 2000 °F during 45 minutes.

807. For the liquid, see «brownish red». After two and four years of soaking, the residual solid is «yellow» with a layer of «brown» matter at the surface.

808. At 242.804 Mrad, there is no change perceptible to the naked eye.

809. The colour becomes lightly more accentuated as the quantity of zirconium silicate is increased.

810. The colour is lightly more accentuated than the one resulting from the combination comprising 1 g of zirconium silicate.

811. The modalities of this test may vary: 1) the duration of the heating process may be shortened or prolonged; 2) the heating may be done from ambient temperature to a determined temperature with a) immediate removal or b) prolonged heating at a determined temperature; 3) the proportions of the components may vary.

812. The colours are more vivid when we use NaCl.

813. The rock is darker, more brown and has adopted an «orange tone» which appears even in its depth.

814-893. The notes ranging from 814 to 893 are annuled.

894. The change is minimal at each step and, therefore, very slow. Haematite, at the state of a rock, irradiated with electrons at 164,800 rad, does not undergo any change perceptible to the naked eye.

895. After two years of soaking, the liquid is lightly amber and the solid is «medium chocolate-brown». The major part of the liquid was not kept. Thus, we are speaking here mostly of the colour of the residual solid.

896. For the colour of the solid, see «mixture of particles: orange-brown / chocolate-brown / white».

897. The colour differs according to the variety of the sizes of the galena particles which were applied.

898. For the colour of the solid, see «black».

899. For the colour of the solid, see «greyish brown».

1966

900. The solid is comprised of three layers of colours: at the surface, «brown»; in the middle, «grey»; the one at the bottom, «orange».

901. For the colour of the liquid, see «light brown».

902. The solid is comprised of two layers of colours: at the surface, «grey»; at the bottom, «brown».

903. The solid is comprised of two layers of colours: at the surface, grey; at the bottom, «brown».

904. Covered with a «greenish yellow» layer of powder.

905. As soon as deposited in the acid, the calcite starts bubbling. It changes from «white» to «light yellow», which becomes more accentuated with the passage of time. Another drying process (drying oven, sand bath, naturally, etc.) would probably allow to keep the «yellow», which became more brown under the action of the heat.

906. The amount of «blue» particles increases.

907. A combination of the mineral and the sodium carbonate, in which the carbonate would predominate, would most likely produce greens as in the case of the oil soot heated with carbonate at 1600 °F and 1900 °F.

908. With «brownish green» particles.

909. For the colour of steatite in its depth, see «greyish brown»; for that of the glaze, «brownish grey».

910. For the colour of the steatite in its depth and the one of the glaze, see «grey».

911. Mostly «brown».

912. The drying could have been progressive in ambient air.

913. Instead of being heated, in the first place, and afterwards treated with ammonia, the opposite could have been done. Thus, each colour obtained could have been heated from the ambient temperature to a chosen temperature (ex.: 500 °F), for a determined duration (ex.: 1 h, 2 h, etc.). Furthermore, at each determined temperature, a varying amount of ammonia could have been applied (1 ml, 2 ml, 3 ml, 5 ml, etc.). This observation may be applied to all the colours treated with ammonia.

914. For the colour of the solid, see «beige-grey».

915. Dull «brown».

916. The colour is more luminous than at the origin.

1967

917. When crocidolite is previously heated (ex.: 1900 ºF) and, afterwards, treated with acid, the result is not interesting when compared to the one obtained with asbestos in similar conditions. After having been heated at a high temperature and treated with acid, various tones of «rusty brown» are obtained with crocidolite. This is not a great achievement in the colour field, though it adds itself to the many browns already present in the system.

918. The conditions could have varied: 1) prolonged or shortened heating duration; 2) heating from ambient temperature and rising to a determined temperature (ex.: 1000 ºF), with a) immediate removal, when the temperature is reached, b) prolonged heating when the temperature is reached (ex.: 1 h, 30 minutes, 2 h); 3) modification of the proportions of the components.

919. The glaze is adherent up to 1900 ºF. No further testing was made.

920. See note 913.

921. A thick layer of «phtalo-blue» matter covers a thin layer of «dark brown» matter.

922. The «brown» colour of this rock is ten times more intense than the one of the same mineral irradiated at its natural state at 604.53 Mrad and of the same mineral wrapped in bread dough and irradiated at 5.7 Mrad.

923. The «brown» colour is less dark than that of the calibre: it is more «brownish» than «blackish».

924. The «brown» colour is darker than that of the calibre and, at the same time, more accentuated.

925. With «medium orange» particles.

926. With a few «red» particles.

927. The natural «bluish turquoise» oxidization layer, originally covering the rock, became «apple-green» and «brownish orange» when irradiated.

928. «Blackish grey» in appearance, at the state of powder, and «blackish brown» when diluted in water.

929. «Blackish grey» in appearance, at the state of powder, and «blackish brown» when diluted in water.

930. The once brilliant surface has become mat.

931. The mineral is almost opaque.

932. From 5 to 482.984 Mrad, the rock becomes more and more mat.

933. With a few «rusty orange» particles.

1968

934. Immediately after the removal from the furnace, the dry pigment appears as a «blackish green-blue» to the naked eye. A few seconds later, when it is diluted in water, the same pigment appears to be «blackish brown» when held in my palm. The same goes when I observe the dry pigment.

935. Certain areas have orange reflections.

936. The colour is more intense than at 10 Mrad.

937. The smaltite has lost its metallic reflection; it is mat.

938. A combination, in which the sodium carbonate would predominate, would most likely produce «greens» as it is the case for the oil soot from 1600 °F to 1900 °F.

939. This note is annuled.

940. Mostly «brown».

941. It is possible that the graphite and the sodium carbonate were insufficiently grinded together.

942. The «dark grey» areas have become «blackish brown»; the «orange-red» areas, «reddish brown». The shiny rock has become mat.

943. The mineral is entirely coloured with this colour.

944. The colour is «brown» lighter than the one obtained at 1600 °F. The glaze is mat and opaque. In the areas, where the glaze is thin, the colour is «Naples yellow».

945. The reddish brown apatite, irradiated at the state of a rock with electrons at 164.800 rad, undergoes no change perceptible to the naked eye.

946. The molybdenite, at the state of a rock, irradiated with electrons at 305,200 rad[73], undergoes no change perceptible to the naked eye. The same goes when it is irradiated with neutrons during 2,000 seconds at $10^{12}$ neutrons / $cm^2$ / second, and, also, when it is afterwards soaked in the D19 Kodak developer.

947. The natural pyrochlore, irradiated at the state of a powder during 2,000 seconds at $10^{12}$ neutrons / $cm^2$ / second, undergoes no change perceptible to the naked eye. The same goes when it is afterwards soaked in the D19 Kodak developer.

948. The change is slow and progressive.

949. The «brown» is darker than the colour of the sample at 360 Mrad.

950. The mineral acquires opaqueness.

951. Certain samples have transparent green areas. These areas evolve towards a «more accentuated green» and a greater opaqueness.

952. This series of colours could have begun at 0 °F and ended at 2300 °F or even at a higher temperature. Once the temperature has been reached, the samples could have been immediately removed or they could have been kept at this determined temperature during a chosen time. We could have removed a sample, for example, at every 100 °F; combined the minerals before the heating according to various proportions; combined the minerals after their respective heating, according to various proportions; combined them both before heating and after heating and reheat them anew according to various modalities. In fact, we can try out an infinity of possibilities. All we need is imagination.

953. All the tones of a same colour are different one from the other, even though they have the same designation.

954. The process is applicable to all the strata of the Red Mill deposit, underneath this layer of «rusty orange» mineral, as well as those of the neighbouring deposit (near the railroad), composed of various layers of «grey» ranging to «black». Their various degrees of oxidation and reduction, due to the more or less close contact with oxygen, may consequently offer a variety of modalities of tones or even of colours by using the same processes as those described in the colour system.

955. The residual solid is composed of three layers of colours: at the surface, «orange-brown»; the layer in the middle, «white»; the one at the bottom: «chocolate-brown».

956. Through all of the irradiation dosages, we percieve in each rock a lasting «green reflection».

957. As the dosage increases, the brilliance of the rock progressively disappears.

958. The colour is identical to the one of the natural hornblende, heated at 2000 °F during 45 minutes.

959. As the dosage increases, the silver particles, which have a «light golden yellow reflection», progressively become «dark gold».

960. The nickeliferous pyrrhotite, at the state of a rock, irradiated with electrons at 164,800 rad, undergoes no change perceptible to the naked eye.

961. The last sample has grown pale.

962. Through all the irradiation dosages, we observe in each rock a lasting «green reflection».

963. Certain samples have transparent green areas. These green areas evolve towards a «more accentuated green» and a greater opaqueness.

964. After two years of soaking, the liquid is slightly «crimson-violet» and, the matter, «white». The solution (mineral-acid) has been considerably reduced on the hot plate.

The separation of the liquid and the solid would have allowed to obtain two distinctive colours.

965. As the irradiation dosage increases, the rock progressively loses its brilliance to become mat.

966. The colour is darker than the one obtained, when the heat treatment is done without sulphur at 1300 °F during one hour.

967. These remarks may be applied to all the tests done with the galena; they all resulted in obtaining a glaze. 1) The aspect of the colour varies according to the quantity of galena and the grinding degree. 2) The grinding degree influences the temperature at which the mineral melts. 3) The test may be done by immediately depositing the galena at a given temperature (ex.: 1600 °F) and maintaining it during a determined amount of time (ex.: 1 h, 2 h, etc.).

968. When heated, the cement is less friable if a quantity of galena is integrated to its mass, during the production process.

969. In the area where the glaze is thin, the colour is «orange» and «yellow».

970. The glaze is darker than at 1650 °F.

971. If the sodium carbonate predominated in the combination, it would most likely (when considering the results of other tests) give a «green» at this point, which would become more accentuated and would modify itself at higher temperature.

972. At 242.804 Mrad, there is no change perceptible to the naked eye.

973. The evolution of the colour is the same for the powder and the rock. However, there is a considerable difference of intensity. The colour of the powder is much less dark and intense.

974. The brilliance or the metallic reflection of the rock disappears as the irradiation dosage increases, to finally become mat.

975. The colour remains more or less of the same intensity, but the «brown» becomes more accentuated.

976. The metallic particles have almost all disappeared.

977. As the irradiation dosage increases, the silver particles, which have a «light golden yellow reflection», progressively become «dark gold».

978. The nickeliferous pyrrhotite, at the state of a rock, irradiated with electrons at 164,800 rad, does not undergo any change perceptible to the naked eye.

979. The rock is almost opaque. It immediately passes from translucence to semiopaqueness.

980. For the colour of the liquid, see «dark reddish brown».

981. The colour is much darker than the colour of the shale irradiated at its natural state. A «greenish yellow» deposit formed itself at the surface.

982. The spodumene, at the state of a rock, undergoes no change perceptible to the naked eye, when irradiated with electrons at 302,831 rad[45].

983. It is difficult to clearly identify the colour because of the opaqueness. Il is possibly «dark brownish green».

984. The colour is darker than the one of the previous sample.

985. Very few golden particles remain. Those who do remain have darkened.

986. The pigment appears to be «dark brownish grey», when it is dry. Soaked in water, it is «chocolate-brown».

987. The colour is uniform.

988. The piece of cement is divided in two areas, which have two different colours.

989. The colour is a bit darker than the natural colour.

990. The colour is the same at 1600 °F and 1700 °F.

991. The rock is almost opaque.

992. These modifications of both the irradiated anorthosite and peridotite are important because they have consequences (at the level of the colour obtained) when they are later mixed and heated with sodium or potassium carbonate.

993. At this point, the mineral has completely lost the «evergreen tone».

994. The rock conserves the translucence.

995. The colour has darkened and considerably lost its luminosity.

996. The yofortierite does not undergo any change perceptible to the naked eye, when irradiated at the state of powder during 2,000 seconds at $10^{12}$ neutrons / $cm^2$ / second. The same goes, when it is later soaked in the D19 Kodak developer.

997. The cement is not friable. It has to be broken in a bronze mortar.

998. This series of colours could have been a) prolonged up to 2300 °F or even at higher temperatures, b) heated from the ambient temperature and risen to a determined temperature, with immediate removal or prolonged heating at this same temperature. I could also have removed a sample, for example, at every 100 °F, combined it before heating with various proportions of sulphur, combined after heating with various proportions of sulphur and heat the combination anew according to various modalities, that is to say starting at ambient temperature or heating it during a chosen period at a determined temperature. Thus, we are placed in front of an infinity of conditions for the same mineral. On the one hand, we take this mineral at its natural state and heat it with various proportions of sulphur, either from the ambient temperature and rising to high temperatures or by immediately removing the sample once the temperature has been reached (ex.: 1350 °F) or after having kept it at this temperature during a determined period (ex.: 1 h, 2 h, etc.). On the other hand, we take the mineral, already heated at any temperature, combine it with various proportions of sulphur and heat the combination anew according to the various conditions mentioned above.

999. All the tones of the same colour differ one from the other, even if their designation is identical.

1000. The process is applicable to all the strata of the Red Mill deposit, underneath this layer of «rusty orange» mineral, as well as those of the neighbouring deposit (near the railroad), composed of various layers of «grey» ranging to «black». Their various degrees of oxidation and reduction, due to the more or less close contact with oxygen, may consequently offer a variety of modalities of tones or even of colours by using the same processes as those described in the colour system.

1001. The colour is more rec than the previous brown.

1002. These remarks are applicable to all the tests done with galena; they all resulted in obtaining a glaze. 1) The aspect of the colour varies according to the quantity of galena and the grinding degree. 2) The grinding degree influences the temperature at which the mineral melts. 3) The test may be done by immediately depositing the galena at a given temperature (ex.: 1600 °F) and maintaining it during a determined amount of time (ex.: 1 h, 2 h, etc.).

1003. A layer of «grey» colour accompanies it.

1004. Opaque. This colour differs from the «dark chocolate-brown», obtained with gamma rays at 360 Mrad.

1005. In the area where siderite is the thinnest, it appears translucid; where it is the thickest, opaque. From 247.6 Mrad, even the thin areas are opaque. The surface has also become mat.

1006. The colour is equivalent in intensity to the one obtained at 148.4 Mrad.

1007. The colour is equivalent to the one obtained at 201.6 Mrad.

1973

1008. The rock, observed in sunlight, is translucid on its circumference and opaque at its center.

1009. The solution is composed of 100 ml of distilled water, 15 g of tartaric acid and 10 ml of hydrochloric acid.

1010. The rock, observed in sunlight, is translucid on its circumference and opaque at its center.

1011. The pyrrhotite, at the state of a rock, undergoes no change perceptible to the naked eye, when irradiated with electrons at 164,800 rad.

1012. With «green» particles.

1013. The colour differs slightly from the one obtained, when halite was irradiated at the same dosage, without having been previously heated.

1014. The colour, between «grey» and «brown», is difficult to identify.

1015. The colour is the same at 11.4 Mrad.

1016. The golden particles appear to be more silvery and colder.

1017. At 65.65 Mrad, there is no change perceptible to the naked eye.

1018. Certain areas are «orange»; others, «apple-green».

1019. The colour remains more or less the same.

1020. For the colour of the solid, see «light beige».

1021. Certain particles are «blue».

1022. The evolution of the colour is the same for the pow der and the rock. However, there is a considerable gap between the intensities. The colour of the powder is considerably less dark and intense.

1023. Only the crystalline part of the rock is being observed, since the molybdenite as such is examined at «grey».

1024. The colour is slightly darker than the colour obtained at the previous stage.

1025. The colour is identical at 17.91 Mrad.

1026. The golden particles are still more golden.

1027. The difference is minimal from one step to another. The golden particles are always more and more golden.

1028. The grey agate, at the state of a rock, undergoes no change perceptible to the naked eye, when it is irradiated with electrons at 305,200 rad[73].

1974

1029. The colour is less dark than the one obtained at the previous stage.

1030. The colour is equivalent at 17.91 and 22.8 Mrad.

1031. After two years of soaking, the liquid is «yellow»; the solid, «medium chocolate-brown». The liquid has not been kept.

1032. For the glaze, see «brownish grey». For the colour of the steatite at the surface, see «brown».

1033. The colour does not have any «caramel tone».

1034. The rock is almost totally opaque.

1035. The colour is less dark than the colour of the calibre.

1036. The rock is semitranslucid.

1037. For the last four tests (8363 à 8366), part of the circumference of every sample has a light «greenish blue» tint.

1038. The colour is lighter than that of natural asbestos. The texture of asbestos modifies itself. No fiber is left; only powder.

1039. The «grey» is more accentuated than the original «very light grey».

1040. The «beige-grey» is less brown and more grey than the «very, very light beige-grey».

1041. The colour is darker than those of the previous two phases.

1042. The small particles are «accentuated greenish turquoise»; the smallest, «darker beige-grey».

1043. For a few irradiation dosages, the tone will be «between "grey" and "beige"» and, consequently, difficult to define.

1044. The rock conserves the same translucence.

1045. The smallest particles have a «beige tone».

1046. The colour is less luminous and, the «green tone», less accentuated. The change is not perceptible to the naked eye, but through the magnifying glass. At 5, 10 and 57.4 Mrad, there is no change perceptible to the naked eye. Therefore, the «green tone» diminishes; the «beige tone» increases and the colour is more pale.

1047. At 247.6 Mrad, the colour is a «beige tint». The «grey» has entirely disappeared. This tint accentuates itself progressively.

1048. The mineral is more opaque.

1975

1049. The colour is at the state of a tint.

1050. The colour remains at the state of a tint.

1051. At 5.7, 11.4 and 17.91 Mrad, there is no change perceptible to the naked eye.

1052. The «orange-amber» film, which wraps the white crystal of sardonyx became «medium burnt orange» at 5 Mrad and «dark orange» at 64.7 Mrad. It darkens and becomes more brown, as the irradiation dosage is increased.

1053. The sardonyx, at the state of a rock, undergoes no change perceptible to the naked eye, when a sample is irradiated during 7 days and is placed directly at the exit of the primary beam of a Philips X ray generator (copper radiation, 20 mA current, 40 kV voltage).

1054. The pigment is translucid, with a few «green» particles.

1055. The pigment is partially made of crystals (see «yellow») and partially metalized. The «grey» obtained has the same white reflection as a 5 cents, except that it is «brownish tone». When reduced to powder, this «grey» will give various blues and greens when applied in nitric, hydrochloric and sulphuric acids, as well as in their various combinations.

1056. The colour still conserves a bit of a «blue reflection».

1057. The colour, which is between «grey» and «brown», is hard to identify.

1058. After this irradiation, the «grey» predominates on the «brown».

1059. The rock becomes semitranslucid.

1060. The rock has a «blue reflection», when we look at it in a light penumbra.

1061. The rock is still more opaque. Therefore, it passes from opalescence to opaqueness.

1062. At 5 and 10 Mrad, there is no change perceptible to the naked eye.

1063. The colour changes occur slightly at each dosage.

1064. The colour is between the «light grey (light green tone)» and the colour obtained at 124.704 Mrad.

1065. The «grey» has completely lost the «green tone».

1066. Observation at the surface.

1067. The rock becomes «brownish grey» at its center, which was previously «pink». The matrix of the rock is «white» and «grey». The matter is mat.

1976

1068. Some areas are «orange»; others are «apple-green».

1069. The colour of the powders, filtered at 14 and 42 meshes and irradiated firstly with gamma rays at 17.1 Mrad and, secondly, with X rays, seems to be identical, when percieved by the naked eye, to the colour obtained when solely irradiated with gamma rays at 17.1 Mrad.

1070. The mineral progressively loses its «golden silvery metallic reflection».

1071. The change is light. The «brown tone» becomes less important.

1072. At 254.204 Mrad, the «brownish grey» is the same as at 63.984 Mrad.

1073. Or «greyish brown». The colour is between the «grey» and the «brown».

1074. At 5 Mrad, there is no change perceptible to the naked eye. At 10 Mrad, the golden particles are more yellowish.

1075. At this point, the size of the golden particles diminishes.

1076. The «golden yellow» particles are more accentuated at this point.

1077. Firstly, the «golden yellow» particles become more accentuated and, at the same time, more contracted and evident. Afterwards, after having reached a certain dosage summit (287.3 Mrad), from 360 to 604.53 Mrad, they diminish until they almost disappear. It follows that, throughout the process, the surface becomes more and more mat.

1078. The smallest particles, ranging from translucence to opaqueness, become «brownish grey»; the biggest, translucid, «olive-green».

1079. The rock is still semitranslucid.

1080. A semi-quantitative spectrographic analysis by X ray spectrofluorescence of the «medium brownish grey» result gave the following: %Elmt: 32.19 AsK / 54.23 PbM / 1.86 SiK / 10.95 S K / 0.000 CaK / 0.99 FeK / .000 CoK for a total of 100.00.

1081. A semi-quantitative spectrographic analysis by X ray spectrofluorescence of the «medium brownish grey» result gave the following: %Elmt: 58.42 AsK / .000 PbM / .029 SiK / 0.95 S K / 12.59 CaK / 4.60 FeK / 11.19 CoK / 12.13 NiK for a total of 100.00.

1082. The colour is identical at 17.91 and 22.8 Mrad.

1083. The sample is irradiated at 17.91 and 22.8 Mrad; the colour, obtained in both cases, is identical to the one obtained at 11.4 Mrad.

1977

1084. The colour remains the same up to 11.4 and 17.91 Mrad.

1085. The rock is more opaque.

1086. When observed with the naked eye, the colour of the rock seems to be the same than when it is irradiated successively with gamma rays at 17.91 Mrad and then with X rays.

1087. Certain particles are «blue».

1088. This colour resembles «caput-mortuum».

1089. The colour is the same at 122.984 Mrad.

1090. The mineral has lost its fluorescence.

1091. For the colour of the liquid, see «light greyish lilac».

1092. The cement must be broken in a bronze mortar.

1093. An area of the rock is «amber-grey».

1094. Certain particles are «blue».

1095. The mineral is «black» in appearance. It became opaque. Certain particles are «blue».

1096. For the colour of the liquid, see «lilac». After two years of soaking, the solid is «medium chocolate-brown» with an «orange-brown» layer of powder at the surface.

1097. At 5 and 482.984 Mrad, the mineral progressively becomes more mat.

1098. The colour varies from the natural «brownish black».

1099. The colour is less dark, however, than when the combination is done with sodium carbonate.

1100. The mineral progressively loses its metallic reflection and becomes mat.

1101. There is a «dark and intense royal-blue» deposit on the porcelain.

1102. Afterwards, it could have been applied in the four acids.

1103. The colour is the same at 11.4 and 17.91 Mrad.

1104. The silvery particles begin to disappear at this point. They diminish progressively as the dosage increases.

1105. The silvery spots have completely disappeared.

1106. At this point, there is an important change.

1107. The original «golden yellow» particles have almost totally disappeared.

1978

1108. The colour obtained is darker and more brown than the natural colour.

1109. The silver particles, which are slightly golden, progressively become «dark gold». The matter in itself seems to change fundamentally; not just the colour. The particles are diminished and they melt, on top of changing in colour.

1110. The colour is darker than the natural colour. It is less brown, when the mineral is combined with hydrochloric acid.

1111. The colour is much darker than the natural colour.

1112. The pigment is less opaque than the natural mineral.

1113. The colour is colder than the other «greys» obtained by combining the soot with some acids. It is less opaque than the natural black.

1114. The colour has lost a great part of its blue and silvery reflection. The little bit of residual metallic reflection left is slightly golden.

1115. With «cobalt-blue» particles.

1116. The «orange» circumference becomes, at 5 Mrad, slightly more orange; at 102.4 Mrad, «darker orange»; at 148.4 Mrad, «still darker orange». It therefore becomes more accentuated and darker.

1117. The colour is located between the natural colour (light grey [light green tone]) and the colour obtained at 124.704 Mrad.

1118. There is no change perceptible to the naked eye at 5, 10, 57.4, 65.704, 102.4 and 148.4 Mrad.

1119. The change in colour is deep.

1120. The liquid is transparent. The solid is composed of three layers of colours: at the surface, «white»; the layer in the middle, «grey»; the layer at the bottom, «brownish grey (green tone)».

1121. For the colour of the liquid, see «grass-green».

1122. The «grey» is less dark, but more opaque than the other «greys» obtained with oil soot soaked in acids.

1123. The «grey» is less opaque than the natural colour.

1124. The semi-quantitative spectrographic analysis of halite, irradiated with gamma rays at 39.9 Mrad, may be read as follows: WT%: 16.89 Na-K / 5.97 Al-K / 0.00 Si-K / 1.76 S-K / 73.93 Cl-K / 1.45 Ca-K. The sample irradiated with gamma rays at 73.25 Mrad: Wt%: 20.38 Na-K / 0.00 Al-K / 0.00 Si-K / 1.77 S-K / 76.06 Cl-K / 1.79 Ca-K. See «iron-grey» for the halite irradiated at 5.7 Mrad.

1979

1125. Certain particles are «blue».

1126. The mineral is almost opaque.

1127. In the case of the irradiated crystalline quartz, the word «tone» designates the reflection perceived by the naked eye, when the rock is observed in daylight.

1128. The observation is done at the surface.

1129. The colour is located between the colours of the previous phase and the following.

1130. The colour is darker than the previous one.

1131. The combination of the «reddish brown tone» and the silvery metallic reflection» gives it a «crimson» aspect.

1132. The «pink reflection» is located in certain areas. After two years, the liquid is very, very slightly «amber»; the solid, «orange-brown».

1133. At 148 and 247 Mrad, the colour may be defined as a «tone».

1134. The «blue-grey» is darker than the one obtained when the sample was irradiated with X rays during 7 days at the chemistry department of the Montreal University.

1135. The smallest particles are «blue-grey»; the biggest, «fairly vivid beige (crimson reflection)».

1136. The colour has passed from a «reflection» to a «tone». Therefore, it is more accentuated. However, the tone is very, very light.

1137. The rock maintains the same translucence.

1138. The analysis of the white Portland cement may be read as follows: $SiO_2$ 21.6% / $Al_2O_3$ 5.2% / $Fe_2O_3$ .3% / CaO (total) 66.3% / CaO (Free) 2.0% / MgO 0.9% / $SO_3$ 3.1% / Loss at fire 2.2% / $C_3S$ 55.8% / $C_2S$ 19.4% / $C_3A$ 13.5%.

1139. From 1850 °F, when the «green tone» becomes considerably more accentuated, because of the bad distribution of the chrome particles in the cement, only green spots may be perceived around the particles.

1140. Under a natural sunny and luminous lighting, the chalcopyrite, irradiated at 424.7 Mrad, appears to be of a strong green, still more green than grey.

1141. When one humidifies the pigment, either when it is hot, before the heating process or during the heating process, either the three of them, this vivifies the colour.

1142. The colour is less dark than the «natural metallic grey», but it is more opaque.

1980

1143. The olivine evolves but very lightly at low dosages. Furthermore, the changes are weak until 424.7 Mrad.

1144. The solid is composed of three layers of colours: at the surface, «white»; the layer in the middle: «grey»; the layer at the bottom: «brownish grey (green tone)».

1145. The «yellow tone» is localized.

1146. The mineral is transparent with a «grey tint».

1147. The colour is in fact at the state of a tint. Because the colour may be said to be located halfway between the «grey» and the «beige», it is hard to define it precisely.

1147a. For the colour of the solid, see «very, very light iron-grey (with a few "cobalt-blue" partic les)».

1148. With «brown» particles.

1149. The mineral is semitranslucid.

1150. For the colour of the liquid, see «greenish smoky grey».

1151. For the colour of the liquid, see «royal-blue». It would be possible to build a series of «royal-blue» having various modalities.

1152. For the colour of the solid, see «lilac».

1153. Neither ether, nor ammonia modifies the fibrous structure. The transformation of the «grey» is possibly superficial.

1154. The colour does not have the «brown tone» of the calibre.

1155. The colour loses its «green tone».

1156. With «dark grey» particles.

1157. With «dark iron-grey» particles.

1158. With «black» particles at the surface.

1159. For the colour of the liquid, see «dark grey».

1160. There is a thin layer of «light grey» matter at the surface and «green» at the bottom.

1161. In both cases, after two weeks of soaking, there was an «iron-grey» matter at the bottom and an «intense wine-red» liquid at the surface. It would have been necessary to separate the liquid from the «grey» solid in order to keep the «wine-red» colour.

1981

1162. This note is annuled.

1163. At the surface of the solid, there lies a «white» layer of matter.

1164. After two years of soaking, the solid is «white [with orange, brown and grey particles]».

1165. The colour is lighter than those obtained at the previous steps. In terms of clarity, it resembles the colour obtained at 5 Mrad.

1166. After two years, the liquid is «reddish violet» and, the solid, «dark reddish brown». The two were not separated before their drying.

1167. With «brown» particles.

1168. The quartz (with impurities of white kaolinite), at the state of a rock, does not undergo any change perceptible to the naked eye, except that the sample is pierced, when it is irradiated with a UV laser beam during 5 minutes on a surface of 0.01 $cm^2$ with a laser energy of 0.245 Joule having a flux of 8.2 x $10^8$ W / $cm^2$ which gives a total energy of 1,470 Joules.

1169. Up to this point, there is no change of the translucence perceptible to the naked eye.

1170. The obsidian, at the state of a rock, does not undergo any change perceptible to the naked eye, when it is irradiated with gamma rays at 65.704 and 604.53 Mrad or with electrons et 164,800 rad.

1171. The surface and the depth of the rock is coloured with a much darker «grey» colour than the colour of the calibre or the one of the same mineral irradiated at 244.53 Mrad without being previously wrapped in dough.

1172. The solid, resting at the bottom of the becher, is comprised of three layers of colours: at the surface, «brown»; the layer in the middle, «grey»; the layer at the bottom, «orange».

1173. The residual solid is comprised of two layers of colours: at the surface, «grey»; at the bottom, «brown».

1174. The residual solid is comprised of two layers of colours: at the surface; «grey»; at the bottom, «brown».

1175. For the colour of the liquid, see «greyish blue».

1176. The residual solid is comprised of three layers of colours: at the surface, «white»; the layer in the middle, «grey»; the layer at the bottom, «brownish grey (green tone)».

1177. The result is opaque, mat and dull.

1982

1178. Instead of «amber-brown», the colour of halite irradiated in its natural state, without soaking in acid.

1179. The «blue» particles most likely come from the presence of molybdenite.

1180. After two years of soaking, the solid is «medium iron-grey», with a layer of black matter (possibly «dark green») at the surface.

1181. Concerning this test, at the time of the deposit of the mineral in the acid, the solution becomes «green». It remains as such during a short interval; then, it whitens. When it is deposited on the hot plate, it becomes a magnificient «green», but, when brought to the boiling point to dry, it becomes «white» again and, finally, «grey».

1182. This is the point of fusion, where a «metallic grey» crust is formed. This melted metal may be grinded and treated with acids (see «blue») and it most likely will give different blue tones.

1183. This «grey» resembles the grey commonly used to paint the verandas of houses.

1184. At 3.77 Mrad, there is no change perceptible to the naked eye.

1185. An entire series of «cold greys», having the same aspect as this one, whitened when they were heated 0†1400 °F and, afterwards, slowly cooled off in the furnace (15 h). On the other hand, the «hot greys», having a brown tone, became in the same conditions «chamois-beige» with either a yellow tone or a salmon tone. Most of these pigments came from Sainte-Foy and its environment.

1185a. The mineral remains at the state of powder because of its too great quantity forming a «pile», considering the low temperature.

1186. This note is annuled.

1187. After 24 hours of soaking, the liquid is «green», while the solid is «medium grey». After the drying, there remains a green crust covering a grey matter.

1188. The dusty «red» deposit at the surface is considerably reduced to the state of traces. The more the dosage is high, the more rare are the red traces.

1189. Only the «dark grey» matter was irradiated.

1190. Than the natural.

1191. With more accentuated golden particles.

1192. For the colour of the liquid, see «blue».

1193. «Dark grey» covered with a layer of a viscous «white» matter at the surface.

1983

1194. For the colour of the liquid, see «light grey».

1195. This mineral is composed of %: SiK .026 / SK .298 / AsL 81.925 / CaK 2.023 / FeK 9.016 / ZnK .018 / CoK 7.943. It is probably the Co element which gives the «blue» and «dark violet-blue» or leaves a «royal-blue» deposit on the porcelain. A great quantity of this element would then become «dark blue», when heated with sodium carbonate. I isolated three times the «blue» or «violet», which prevaled in great quantity (see «blue», «violet»). The iron would be the element which gives the «grey». The AsL would give the «green».

1196. See «blue».

1197. There is a «royal-blue» and «dark emerald-green» deposit on the porcelain.

1198. The colour obtained differs from the original colour.

1199. It is a «dark grey» with «pearly pink» areas having a metallic reflection on the surface.

1200. See note 1183.

1201. This note is annuled.

1202. At 5, 57.4 and 102.4 Mrad, the is no change perceptible to the naked eye.

1203. The colour is darker than the natural colour.

1204. The silver-grey metallic reflection has become, in great part, golden.

1205. The liquid and the solid are not separated; this gives three tones of «grey» with «cobalt-blue» particles.

1206. The biggest particles are «grey», while the smallest are «yellow».

1207. This note is annuled.

1208. This note is annuled.

1209. Certain particles have a «green reflection».

1210. The colour of the natural graphite.

1211. The molybdenite does not undergo any change perceptible to the naked eye, when it is irradiated with gamma rays at 5, 10 and 57.4 Mrad.

1212. The phenomenon is visible in the interior as well as the exterior of the irradiated samples. Furthermore, the exterior progressively becomes more and more mat, but not the interior.

1213. At 242.804 Mrad, the metallic reflection of the stibnite, at the state of a rock, has become more golden than silvery.

1984

1214. The «metallic grey» is less brown at 64.7 Mrad than the «metallic grey» of the calibre.

1215. At 5 Mrad, there is no change perceptible to the naked eye.

1216. The galena powder begins to melt at 1200 °F and form a glaze.

1216a. For the colour of the liquid, see «very, very light grey [almost white], with a few "cobalt-blue" particles».

1217. With a «light royal-blue» and «light phtalo-green» deposit on the porcelain.

1218. With an «intense and dark royal-blue», «violet-pink» and «emerald-green» deposit on the porcelain.

1219. The glaze has two areas: 1) brilliant; 2) mat.

1220. The threshold point is at 1550 °F. The mineral begins to melt at 1400 °F and 1500 °F.

1221. With «green» particles.

1222. The rock is translucid.

1223. For the colour of the liquid, see «dark iron-grey».

1224. With a few green and turquoise particles.

1225. The colour is less intense than the one obtained at 102.4 Mrad.

1226. The «dark iron-grey» is less dark than the natural colour.

1227.

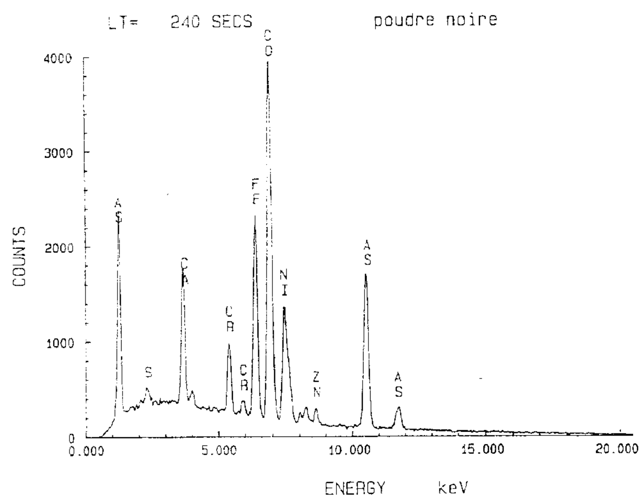

1985

1228. With «dark green» areas.

1229. For the colour of the solid, see «medium iron-grey».

1230. The silvery golden particles progressively become ««dark gold». They also seem to diminish in quantity and to melt.

1231. With «cobalt-blue» particles.

1232. The colour varies, after irradiation, because of the different sizes of granules. A series of granules, having more or less the same size, tends to be «beige» or «brown», while another one tends towards «grey».

1233. The colourless fluorine, at the state of powder, does not undergo any change perceptible to the naked eye, when it is irradiated during 7 days and placed directly at the exit of the primary beam of a Philips X ray generator (copper radiation, 20 mA current, 40 kV voltage).

1234. See note 1232.

1235. The «brownish red tone» gives it the appearance of a «dark violet».

1236. The first «important» change is found at this point.

1237. The pentlandite reacts as the chalcopyrite, that is to say that it progressively loses its silvery golden metallic reflection.

1238. There is no change of translucence perceptible to the naked eye.

1239. With «iridescent metallic» spots.

1240. A great part of the surface is pearly, golden and blue.

1241.The colour is darker than the one resulting from the combination, comprising 1 g of graphite, 3 g of sodium carbonate and 2 g of sulphur.

1242. The colour is less dark than the colour of the combination, comprising 1 g of graphite, 1 g of sodium carbonate and 2 g of sulphur.

1243. For the colour of the liquid, see «pink». After two years of soaking, the colour of the solid does not seem to have changed.

1244. The mineral is deposited in a porcelain crucible, closed with a cover and, then, the entity is wrapped in dough and heated. The crystals do not form themselves and the mineral does not melt as it was the case when the mineral was grinded and heated in ambient air. The matter remains in the same state, but the quality of the «grey» is modified. This modification influences the «blues» which may be obtained when, afterwards, the mineral is treated with acids.

1986

1245. For the colour of the liquid, see «indigo-blue». It is difficult to really see clearly the colour of the mineral which is invaded by the «blue» and very friable. The mineral, heated in dough during 1 hour and a half, will give another kind of «indigo-blue». Thus, it would be possible to build an entire series of «indigo-blues» having various modalities.

1246. The molybdenite has become considerably darker when irradiated. This reaction may have consequences on the ulterior production of blues and greens with acids.

1247. At 604.53 Mrad, the molybdenite is mat at the exterior, but not in the interior.

1248. The coal, at the state of a rock, did not undergo any change perceptible to the naked eye, when it was irradiated with electrons at 164,800 rad. It is very difficult to percieve with the naked eye a change which may have occurred in the coal, at the state of a rock, when it is irradiated with gamma rays at 63.984, 122.984 and 482.984 Mrad. However, when we consider the results obtained with the coal powder, it is most likely that the coal, at the state of a rock, really modified itself, but that the difficulty to percieve the change comes from its shiny texture.

1249. The mineral keeps its metallic reflection, but it is entirely black.

1250. It is black in appearance, but it is possibly «greenish black» or «blackish green».

1251. The colour is more brown than the natural colour.

1252. «Black» more intense and profound than at 64.7 Mrad.

1253. The pigment hardly starts to have a «light green tone», when it is diluted in water.

1254. The «emerald-green tone» of the pigment is a bit more accentuated, when it is diluted in water.

1255. At the bottom, there is a black matter, while, at the surface, there is a slightly amber liquid.

1256. There is a layer of «pearly pink» matter covering a «black» matter.

1257. There are spots, which are «pink, with metallic reflection» at the surface of the «black» pigment.

1258. The mineral is opaque up to 360 Mrad.

1259. The mineral is almost entirely opaque.

1987

1260. One month after the irradiation, the radioactivity of the sample, irradiated during 40,000 seconds at $10^{12}$ neutrons / $cm^2$ / second, is 600. The radioactivity is calculated with a gamma rays spectrometer (background noise: 26.0 cps./sec.). The sample, previously irradiated with gamma rays at 28.5 Mrad and, afterwards, during 40,000 seconds at $10^{12}$ neutrons / $cm^2$ / second, indicates a radioactivity of 225.2; therefore, this sample has three times less radioactivity than the first sample.

1261. There is a crust, which is «black» in appearance, with a «very powerful royal-blue» deposit on the porcelain of the crucible containing the sample.

1262. The «dark grey» areas become «black».

1263. The colour is more profound than the colour of the sample irradiated with neutrons during 40,000 seconds. The radioactivity of a sample, irradiated with neutrons during a) 40,000 seconds and of another sample irradiated with neutrons and gamma rays b) during, for the first, 40,000 seconds and at 555.02 Mrad, for the second, is calculated with a gamma rays spectrometer (background noise: 32.0 cps./sec.) It indicates a) 1,245 cps./sec.; b) 592 cps./sec. When it is previously irradiated with gamma rays and, afterwards, with neutrons, the halite is approximately three times less radioactive than when it is irradiated at a same intensity with neutrons.

1264. At the time of the removal from the furnace, there is a «green» layer at the surface of the pigment. Approximately ten years after its production, this «profound black» pigment, when humidified with water, leaves a «greenish yellow» trace on white paper. The non-treated oil soot leaves a «grey» trace.

1265. Approximately ten years after its production, this «profound black» pigment, when humidified with water, leaves a light «yellowish brown» trace on white paper.

1266. Approximately ten years after its production, this «profound black» pigment, when humidified with water, leaves a very light «greenish yellow» trace on white paper.

1267. Approximately ten years after its production, this «profound black» pigment, when humidified with water, leaves a «greenish yellow» trace on white paper. This trace is slightly more accentuated than the previous one (note 1266), but less than the first one (note 1264).

1268. The rocks, wrapped in dough, were heated in a furnace 0↑150 °F, then removed from the furnace, inserted in mineral wool and deposited in a gammacell to be immediately irradiated. The cooling process was calculated while the sample was in the gammacell with a thermocouple; its metal rod touched the rock. The total temperature decrease occurred over a period of approximately 20 minutes.

1269. The application in the conditions, specified at 2618.6, 2618.7, 2618.8, 2618.9 and 2618.10, was repeated approximately five times. Furthermore, the same resulting pigments were applied in the same kind of resin and under the same conditions, except that the containers were not covered during the hardening process. For every pigment, the colour obtained was «apple-green» with a few slight variations from one to the other. However, approximately five days after the application, the same phenomenon repeated itself. In general, the colour passed progressively from «apple-green» to «beige» or «beige [green reflection]» and the pieces of hardened resin cracked from the interior. In an attempt to remedy this default, I heated the pieces of resin during the hardening process in a furnace specifically used for plastics (see 5646.2, 5047.2, 2618.2, 2618.3, 2618.4 and 2618.5). The result was that the «apple-green» colour of these heated pieces lasted at least for a few years (approximately 10 years), instead of changing immediately, and some pieces did not crack at all during this period of time. Those who did crack, did it a few years later (approximately 10 years). The majority of these last samples also progressively became «milky white» or «beige», with more or less of a green reflection.

1270. The matter, following the heating process, transformed itself completely. The glass is not smooth as usual. It is comprised of flakes of glass, superimposed as a sculpture, but welded together and more or less coloured. The flakes are frosted.

1271. The glaze is almost transparent.

1272. The flakes of mica, while changing in colour, conserve their usual texture and remain a matter suspended in the glass. It has a beautiful decorative effect.

1273. The glaze is mat and translucid.

1274. These are localized reflections in the cement.

1275. While colouring the glass, the matter remains suspended in it.

1276. While colouring the glass, asbestos remains suspended in it.

1277. While colouring the glass, the gneiss remains suspended in it.

1278. The rock is translucid.

1279. The rocks were firstly wrapped in dough, secondly, deposited in a freezer during 2 hours at -20 °C, inserted in mineral wool and immediately deposited in a gammacell for irradiation. Their evolution towards ambient temperature was calculated with a thermocouple.

1280. The «burnt umber» corresponds to the colour appearing at serial number 409 of the pastel Talens - Rembrandt chart (enclosed after Table I).

What is claimed is:

1. A colored mineral powder, comprising one or more powders produced by heating to a temperature of about 300° to about 2200° F. a mineral or metal oxide powder selected from the group consisting of:

actinolite, almandite, andulusite, anorthosite, apophyllite, asbestos, bauxite, bornite, calcite, calcite with clayey inclusions cerite, chalcocite, chromite, clay, copper, corundum, crocidolite, cryolite, solid epidote, gneiss, goethite, heamatite, kaolin, magnetite, microcline, olivine, pentlandite, peridotite, pyrophillite, nickeliferous pyrrhotite, pyrrhotite, sandstone, serandite, smaltite, sphalerite, spodumene, steatite, stilbite, sulphur, titanium dioxide, tremolite, uraninite, vesuvianite, wilsonite, yofortierite, zinc concentrate (ZnO—FeO) ($SO_4$), zincite, zirconium silicate or mixtures thereof, treating with concentrated acid for about a few minutes to about 5 months, and irradiating with:

gamma rays of about 60 Mrad to about 560 Mrad or, electrons of about 162,431 rad to about 305,800 rad or, a laser for about 10 minutes on a surface of about 0.5 $cm^2$ at power of about 0.180 Joule and having a flux of about $6.5\times10^6$ W/$cm^2$ to give a total energy of about 1100 Joules, and optionally mixing the powders made by the above processes.

2. The colored powder of claim 1, wherein after said heating and acid treatments the resulting pigment is mixed with sulphur and/or at least one of the other treated and/or untreated powders listed in claim 1 and then said mixture is heated at about 1300° to about 1500° F., and then said irradiating step is performed, and optionally mixing said powders with the treated and/or untreated powders of claim 1 or with different powders made by the above processes.

3. The colored powder of claim 1, is treated with a concentrated acid and then mixed with one of the other said treated and/or untreated powders of claim 1 or a metal salt prior to said heating and irradiating steps, and optionally mixing said powders with the treated and/or untreated powders of claim 1 or with different powders made by the above processes.

4. The colored powder of claim 1, wherein after said heat treatment and prior to said irradiation treatment, the mineral powder is treated with ammonia, and optionally mixing said powders with the treated and/or untreated powders of claim 1 or with different powders made by the above processes.

5. The colored powder of claim 1, wherein the acid treatment is performed prior to the heat and irradiation treatments, and optionally mixing said powders with the treated and/or untreated powders of claim 1 or with different powders made by the above processes.

6. A colored material, which is produced by incorporating a colored powder of any one of claims 1–5 into or onto a material selected from the group consisting of polyesters, acrylics, synthetic alkyds, ink, enamel paint, glass or cement and then further subjecting such a mixture to a least one thermal treatment in open or hermetically sealed vessels at about 100° to about 2280° F. and/or irradiation with gamma rays of about 5 Mrad to about 360 Mrad or electrons of about 50,000 rad to about 170,000 rad, thus transforming the initial color or lack of color of said pigmented material, and optionally mixing said colored materials with one or more of the treated and/or untreated powders of the preceding claims or with different colored material made by the above processes.

* * * * *